US008694397B2

(12) United States Patent
Seubert et al.

(10) Patent No.: US 8,694,397 B2
(45) Date of Patent: Apr. 8, 2014

(54) CONSISTENT SET OF INTERFACES DERIVED FROM A BUSINESS OBJECT MODEL

(75) Inventors: Michael Seubert, Sinsheim (DE); Jochen Rasch, Sandhausen (DE); Axel Kuehl, Nussloch (DE); Stefan Adelmann, Mannheim (DE); Gabriel Alvarez, Hockenheim (DE); Markus Biehler, Landau (DE); Daniel Bock, Heidelberg (DE); Andreas Bold, Ludwigshafen (DE); Andreas Brossler, Gaiberg (DE); Daniel Buchmann, Pfinztal (DE); Renzo Colle, Rastatt (DE); Robert Doerner, Offenbach (DE); Stefan Elfner, Heidelberg (DE); Stefan Franke, Buxtehude (DE); Werner Gnan, Angelbachtal (DE); Antonia Gross, Nuβloch (DE); Toralf Grossmann, Wiesloch (DE); Gerhard Gschwender, Bangalore (IN); Joerg Hendricks, Montreal (CA); Wolf Hengevoss, Wiesloch (DE); Stephan Hetzer, Oskingem (DE); Christine Hofmann, Karlsruhe (DE); Volker Jaeck, Nussloch (DE); Bernhard Kelnberger, Rauenberg (DE); Johann Kemmer, Muehlhausen (DE); Joachim Kenntner, Heidelberg (DE); Adam Kiwon, Hannover (DE); Karsten Koetter, Heidelberg (DE); Thilo Kraehmer, Heidelberg (DE); Corinne Kuster, Muehlhausen/Kraichgau (DE); Christoph Lehner, Heidelberg (DE); Werner Liebold, Wiesloch (DE); Thomas Maag, Reilingen (DE); Otto Makris, Heidelberg (DE); Andreas Morsch, Mannheim (DE); Wolfgang Nieswand, Muehlhausen (DE); Thomas Nitschke, Nussloch (DE); Dietmar Nowotny, Dielheim (DE); Markus Peter, St. Leon-Rot (DE); Georg Podhajsky, Philippsburg (DE); Dominic Poetschke, Ettlingen (DE); Uwe Pyka, Sinsheim-Hilsbach (DE); Ruediger Radcke, Budapest (HU); Gregor Rieken, Walldorf (DE); Volker Ripp, Mannheim (DE); Gerd Ritter, Heidelberg (DE); Paola Sala, Heidelberg (DE); Daniela Schapler, St. Leon-Rot (DE); Matthias Schmitt, Speyer (DE); Andreas Schneider, Bobenheim-Roxheim (DE); Arnulf Schueler, Heidelberg (DE); Dagmar Schultze, Heidelberg (DE); Reiner Seyler, Neidenstein (DE); Ralf Sievers, Walldorf (DE); Gunther Stuhec, Heidelberg (DE); Frank Thome, Karlsruhe (DE); Andre Wagner, Sinsheim (DE); Rudolf Winkel, Walldorf (DE); Tao Yu, Walldorf (DE); Jens Zachmann, Walldorf (DE); Renato Zadro, Bruhl (DE); Theo Zimmerman, Wiesloch (DE); Michael Zoeller, Rauenberg (DE)

(73) Assignee: SAP AG, Walldorf (DE)

( * ) Notice: Subject to any disclaimer, the term of this patent is extended or adjusted under 35 U.S.C. 154(b) by 1369 days.

(21) Appl. No.: 11/155,368

(22) Filed: Jun. 17, 2005

(65) Prior Publication Data

US 2006/0080338 A1 Apr. 13, 2006

Related U.S. Application Data

(60) Provisional application No. 60/577,453, filed on Jun. 4, 2004, provisional application No. 60/581,252, filed on Jun. 18, 2004, provisional application No. 60/582,949, filed on Jun. 25, 2004, provisional application No. 60/656,598, filed on Feb. 25, 2005, provisional application No. 60/669,310, filed on Apr. 7, 2005.

(51) Int. Cl.
*G06Q 40/00* (2012.01)

(52) U.S. Cl.
CPC .................................... *G06Q 40/00* (2013.01)
USPC .......................................................... 705/35

(58) Field of Classification Search
USPC .......................................................... 705/35
See application file for complete search history.

(56) References Cited

U.S. PATENT DOCUMENTS

| | | | | |
|---|---|---|---|---|
| 3,223,321 | A | 12/1965 | Baumgartner | |
| 5,126,936 | A | 6/1992 | Champion et al. | |
| 5,210,686 | A | 5/1993 | Jernigan | |
| 5,247,575 | A | 9/1993 | Sprague et al. | |
| 5,255,181 | A | 10/1993 | Chapman et al. | |
| 5,321,605 | A | 6/1994 | Chapman et al. | |
| 5,463,555 | A | 10/1995 | Ward et al. | |
| 5,627,764 | A | 5/1997 | Schutzman et al. | |
| 5,717,925 | A | 2/1998 | Harper et al. | |
| 5,787,237 | A | 7/1998 | Reilly | |
| 5,812,987 | A | 9/1998 | Luskin et al. | |
| 5,966,695 | A | 10/1999 | Melchione et al. | |
| 5,970,465 | A | 10/1999 | Dietrich et al. | |
| 5,970,475 | A | 10/1999 | Barnes et al. | |
| 5,983,284 | A | 11/1999 | Argade | |
| 6,047,264 | A | 4/2000 | Fisher et al. | |
| 6,058,378 | A | 5/2000 | Clark et al. | |
| 6,073,137 | A | 6/2000 | Brown et al. | |
| 6,092,196 | A | 7/2000 | Reiche | |
| 6,104,393 | A | 8/2000 | Santos-Gomez | |
| 6,115,690 | A | 9/2000 | Wong | |
| 6,125,391 | A | 9/2000 | Meltzer et al. | |
| 6,138,118 | A | 10/2000 | Koppstein et al. | |
| 6,154,732 | A | 11/2000 | Tarbox | |
| 6,222,533 | B1 | 4/2001 | Notani et al. | |
| 6,226,675 | B1 | 5/2001 | Meltzer et al. | |
| 6,229,551 | B1 | 5/2001 | Huang | |
| 6,311,165 | B1 | 10/2001 | Coutts et al. | |
| 6,327,700 | B1 | 12/2001 | Chen et al. | |
| 6,331,972 | B1 | 12/2001 | Harris et al. | |
| 6,332,163 | B1 | 12/2001 | Bowman-Amuah | |
| 6,374,252 | B1 | 4/2002 | Althoff et al. | |
| 6,401,101 | B1 | 6/2002 | Britton et al. | |
| 6,424,979 | B1 | 7/2002 | Livingston et al. | |
| 6,434,159 | B1 | 8/2002 | Woodward et al. | |
| 6,438,594 | B1 | 8/2002 | Bowman-Amuah | |
| 6,442,620 | B1 | 8/2002 | Thatte et al. | |
| 6,446,136 | B1 | 9/2002 | Pohlmann et al. | |
| 6,513,019 | B2 | 1/2003 | Lewis | |
| 6,523,027 | B1 | 2/2003 | Underwood | |
| 6,542,912 | B2 | 4/2003 | Meltzer et al. | |
| 6,591,260 | B1 | 7/2003 | Schwartzhoff et al. | |
| 6,643,660 | B1 | 11/2003 | Miller et al. | |
| 6,725,122 | B2 | 4/2004 | Mori et al. | |
| 6,738,747 | B1 | 5/2004 | Tanaka et al. | |
| 6,745,229 | B1 | 6/2004 | Hauryluck et al. | |
| 6,763,353 | B2 | 7/2004 | Li et al. | |
| 6,775,647 | B1 | 8/2004 | Evans et al. | |
| 6,868,370 | B1 | 3/2005 | Burbridge et al. | |
| 6,937,992 | B1 | 8/2005 | Benda et al. | |
| 6,970,844 | B1 | 11/2005 | Bierenbaum | |
| 7,020,594 | B1 | 3/2006 | Chacon | |
| 7,039,606 | B2 | 5/2006 | Hoffman et al. | |
| 7,055,132 | B2 | 5/2006 | Bogdan et al. | |
| 7,069,278 | B2 | 6/2006 | Telkowski | |
| 7,076,449 | B2 | 7/2006 | Tsunenari et al. | |
| 7,131,069 | B1 | 10/2006 | Rush et al. | |
| 7,206,768 | B1 | 4/2007 | deGroeve et al. | |
| 7,249,157 | B2 | 7/2007 | Stewart et al. | |
| 7,249,195 | B2 | 7/2007 | Panec et al. | |
| 7,269,569 | B2 | 9/2007 | Spira et al. | |
| 7,292,965 | B1 | 11/2007 | Mehta et al. | |
| 7,321,864 | B1 | 1/2008 | Gendler | |
| 7,363,271 | B2 | 4/2008 | Morimoto | |
| 7,379,931 | B2 | 5/2008 | Morinville | |
| 7,383,990 | B2 | 6/2008 | Veit | |
| 7,406,358 | B2 | 7/2008 | Preiss | |
| 7,426,520 | B2 | 9/2008 | Gorelik et al. | |
| 7,451,177 | B1 | 11/2008 | Johnson et al. | |
| 7,454,362 | B1 | 11/2008 | Hayes et al. | |
| 7,481,367 | B2 | 1/2009 | Fees et al. | |
| 7,509,278 | B2 | 3/2009 | Jones | |
| 7,515,697 | B2 | 4/2009 | Eng et al. | |
| 7,516,088 | B2 | 4/2009 | Johnson et al. | |
| 7,523,466 | B2 | 4/2009 | DeAngelis | |
| 7,536,697 | B2 | 5/2009 | Wiseman et al. | |
| 7,574,383 | B1 | 8/2009 | Parasnis et al. | |
| 7,617,128 | B2 | 11/2009 | Greak | |
| 7,617,328 | B2 | 11/2009 | Lewis et al. | |
| 7,627,504 | B2 | 12/2009 | Brady et al. | |
| 7,634,482 | B2 | 12/2009 | Mukherjee et al. | |
| 7,657,466 | B2 | 2/2010 | Klingenberg et al. | |
| 7,689,711 | B2 | 3/2010 | Brouk et al. | |
| 7,788,319 | B2 | 8/2010 | Schmidt et al. | |
| 7,797,204 | B2 | 9/2010 | Balent | |
| 7,805,383 | B2 | 9/2010 | Veit et al. | |
| 7,853,491 | B2 | 12/2010 | Wittmer et al. | |
| 7,865,426 | B2 | 1/2011 | Volpert | |
| 7,873,965 | B2 | 1/2011 | Hayton et al. | |
| 7,895,209 | B2 | 2/2011 | Spence et al. | |
| 7,941,236 | B2 | 5/2011 | Spearman | |
| 7,962,385 | B2 | 6/2011 | Falk et al. | |
| 8,082,243 | B2 | 12/2011 | Gorelik et al. | |
| 8,127,035 | B1 | 2/2012 | Hood et al. | |
| 8,150,798 | B2 | 4/2012 | Ma et al. | |
| 8,185,430 | B2 | 5/2012 | Edwards et al. | |
| 8,326,795 | B2 | 12/2012 | Markovic | |
| RE43,905 | E | 1/2013 | Bierenbaum | |
| 8,370,272 | B2 | 2/2013 | Wickel et al. | |
| 2001/0042032 | A1 | 11/2001 | Crawshaw et al. | |
| 2001/0047372 | A1 | 11/2001 | Gorelik et al. | |
| 2002/0013721 | A1 | 1/2002 | Dabbiere et al. | |
| 2002/0026394 | A1 | 2/2002 | Savage et al. | |
| 2002/0046053 | A1 | 4/2002 | Hare et al. | |
| 2002/0052754 | A1 | 5/2002 | Joyce et al. | |
| 2002/0065680 | A1 | 5/2002 | Kojima et al. | |
| 2002/0072988 | A1 | 6/2002 | Aram | |
| 2002/0087481 | A1 | 7/2002 | Harif | |
| 2002/0087483 | A1 | 7/2002 | Harif | |
| 2002/0099634 | A1 | 7/2002 | Coutts et al. | |
| 2002/0107765 | A1 | 8/2002 | Walker | |
| 2002/0112171 | A1 | 8/2002 | Ginter et al. | |
| 2002/0138318 | A1 | 9/2002 | Ellis et al. | |
| 2002/0147668 | A1 | 10/2002 | Smith et al. | |
| 2002/0152104 | A1 | 10/2002 | Ojha et al. | |
| 2002/0152145 | A1 | 10/2002 | Wanta et al. | |
| 2002/0156693 | A1 | 10/2002 | Stewart et al. | |
| 2002/0156930 | A1 | 10/2002 | Velasquez | |
| 2002/0157017 | A1* | 10/2002 | Mi et al. | 713/200 |
| 2002/0169657 | A1 | 11/2002 | Singh et al. | |
| 2002/0184070 | A1 | 12/2002 | Chen et al. | |
| 2002/0186876 | A1 | 12/2002 | Jones et al. | |
| 2002/0194045 | A1 | 12/2002 | Shay et al. | |
| 2003/0004799 | A1 | 1/2003 | Kish | |
| 2003/0041178 | A1 | 2/2003 | Brouk et al. | |
| 2003/0046639 | A1 | 3/2003 | Fai et al. | |
| 2003/0069648 | A1 | 4/2003 | Douglas et al. | |
| 2003/0083910 | A1 | 5/2003 | Sayal et al. | |
| 2003/0084428 | A1 | 5/2003 | Agostini et al. | |
| 2003/0086594 | A1 | 5/2003 | Gross | |
| 2003/0097287 | A1 | 5/2003 | Franz et al. | |
| 2003/0120502 | A1 | 6/2003 | Robb et al. | |
| 2003/0120665 | A1 | 6/2003 | Fox et al. | |
| 2003/0126077 | A1 | 7/2003 | Kantor et al. | |
| 2003/0167193 | A1 | 9/2003 | Jones et al. | |
| 2003/0171962 | A1 | 9/2003 | Hirth et al. | |
| 2003/0172007 | A1 | 9/2003 | Helmolt et al. | |
| 2003/0172135 | A1 | 9/2003 | Bobick et al. | |
| 2003/0172343 | A1 | 9/2003 | Leymaster et al. | |
| 2003/0195815 | A1 | 10/2003 | Li et al. | |
| 2003/0204452 | A1 | 10/2003 | Wheeler | |
| 2003/0204637 | A1 | 10/2003 | Chong | |
| 2003/0208389 | A1 | 11/2003 | Kurihara et al. | |
| 2003/0212614 | A1 | 11/2003 | Chu et al. | |
| 2003/0216978 | A1 | 11/2003 | Sweeney et al. | |
| 2003/0220875 | A1 | 11/2003 | Lam et al. | |
| 2003/0229522 | A1 | 12/2003 | Thompson et al. | |
| 2003/0229550 | A1 | 12/2003 | DiPrima et al. | |
| 2003/0233295 | A1 | 12/2003 | Tozawa et al. | |
| 2003/0236748 | A1 | 12/2003 | Gressel et al. | |
| 2004/0002883 | A1 | 1/2004 | Andrews et al. | |
| 2004/0006653 | A1 | 1/2004 | Kamen et al. | |
| 2004/0015366 | A1 | 1/2004 | Wiseman et al. | |
| 2004/0024662 | A1 | 2/2004 | Gray et al. | |

2004/0024862 A1 2/2004 Wall et al.
2004/0034577 A1 2/2004 Van Hoose et al.
2004/0039665 A1 2/2004 Ouchi
2004/0073510 A1 4/2004 Logan
2004/0083201 A1 4/2004 Sholl et al.
2004/0083233 A1 4/2004 Willoughby
2004/0122730 A1 6/2004 Tucciarone et al.
2004/0133445 A1 7/2004 Rajan et al.
2004/0138942 A1 7/2004 Pearson et al.
2004/0148227 A1 7/2004 Tabuchi et al.
2004/0167894 A1 8/2004 Ziv
2004/0172360 A1 9/2004 Mabrey et al.
2004/0186891 A1 9/2004 Panec et al.
2004/0187140 A1 9/2004 Aigner et al.
2004/0220910 A1 11/2004 Zang et al.
2004/0254945 A1 12/2004 Schmidt et al.
2004/0267597 A1 12/2004 Kobrosly et al.
2004/0267714 A1 12/2004 Frid et al.
2005/0015273 A1 1/2005 Iyer
2005/0021366 A1 1/2005 Pool et al.
2005/0022896 A1 2/2005 Cnossen et al.
2005/0033588 A1 2/2005 Ruiz et al.
2005/0038718 A1 2/2005 Barnes et al.
2005/0038744 A1 2/2005 Viijoen
2005/0049903 A1 3/2005 Raja
2005/0055369 A1 3/2005 Gorelik et al.
2005/0065987 A1 3/2005 Telkowski et al.
2005/0066240 A1 3/2005 Sykes et al.
2005/0071262 A1 3/2005 Kobeh et al.
2005/0080640 A1 4/2005 Bhaskaran et al.
2005/0108085 A1 5/2005 Dakar et al.
2005/0108168 A1 5/2005 Halpin et al.
2005/0108276 A1 5/2005 Sriram
2005/0131947 A1 6/2005 Laub et al.
2005/0159997 A1 7/2005 John
2005/0171833 A1 8/2005 Jost et al.
2005/0182639 A1 8/2005 Dale
2005/0187797 A1 8/2005 Johnson
2005/0187866 A1 8/2005 Lee
2005/0194431 A1 9/2005 Fees et al.
2005/0194439 A1 9/2005 Zuerl et al.
2005/0197849 A1 9/2005 Fotteler et al.
2005/0197851 A1 9/2005 Veit
2005/0197878 A1 9/2005 Fotteler et al.
2005/0197881 A1 9/2005 Fotteler et al.
2005/0197882 A1 9/2005 Fotteler et al.
2005/0197886 A1 9/2005 Veit
2005/0197887 A1 9/2005 Zuerl et al.
2005/0197896 A1 9/2005 Veit et al.
2005/0197897 A1 9/2005 Veit et al.
2005/0197898 A1 9/2005 Veit et al.
2005/0197899 A1 9/2005 Veit et al.
2005/0197900 A1 9/2005 Veit
2005/0197901 A1 9/2005 Veit et al.
2005/0197902 A1 9/2005 Veit
2005/0197928 A1 9/2005 Fotteler et al.
2005/0197941 A1 9/2005 Veit
2005/0209732 A1 9/2005 Audimoolam et al.
2005/0210406 A1 9/2005 Biwer et al.
2005/0216321 A1 9/2005 Veit
2005/0216371 A1 9/2005 Fotteler et al.
2005/0216421 A1 9/2005 Barry et al.
2005/0222888 A1 10/2005 Hosoda et al.
2005/0222896 A1 10/2005 Rhyne et al.
2005/0222945 A1 10/2005 Pannicke et al.
2005/0228821 A1 10/2005 Gold
2005/0234754 A1 10/2005 Veit
2005/0246240 A1 11/2005 Padilla
2005/0256753 A1 11/2005 Veit et al.
2005/0278693 A1 12/2005 Brunell et al.
2006/0004934 A1 1/2006 Guldner et al.
2006/0005098 A1 1/2006 Lotz et al.
2006/0020515 A1 1/2006 Lee et al.
2006/0026552 A1 2/2006 Mazzitelli et al.
2006/0026586 A1 2/2006 Remmel et al.
2006/0036941 A1 2/2006 Neil
2006/0047574 A1 3/2006 Sundaram et al.
2006/0047598 A1 3/2006 Hansen
2006/0059005 A1 3/2006 Horn et al.
2006/0059059 A1 3/2006 Horn et al.
2006/0059060 A1 3/2006 Horn et al.
2006/0069598 A1 3/2006 Schweitzer et al.
2006/0069629 A1 3/2006 Schweitzer et al.
2006/0069632 A1 3/2006 Kahn et al.
2006/0074728 A1 4/2006 Schweitzer et al.
2006/0080338 A1 4/2006 Seubert et al.
2006/0085336 A1 4/2006 Seubert et al.
2006/0085412 A1 4/2006 Johnson et al.
2006/0085450 A1 4/2006 Seubert et al.
2006/0089885 A1 4/2006 Finke et al.
2006/0095373 A1 5/2006 Venkatasubramanian et al.
2006/0106824 A1 5/2006 Stuhec
2006/0184435 A1 8/2006 Mostowfi
2006/0212376 A1 9/2006 Snyder et al.
2006/0280302 A1 12/2006 Baumann et al.
2006/0282360 A1 12/2006 Kahn et al.
2007/0027742 A1 2/2007 Emuchay et al.
2007/0027891 A1 2/2007 Schauerte et al.
2007/0043583 A1 2/2007 Davulcu et al.
2007/0055688 A1 3/2007 Blattner
2007/0061154 A1 3/2007 Markvoort et al.
2007/0067411 A1 3/2007 Angelov
2007/0067753 A1 3/2007 Pocklington et al.
2007/0078799 A1 4/2007 Huber-Buschbeck et al.
2007/0112574 A1 5/2007 Greene
2007/0118391 A1 5/2007 Malaney et al.
2007/0124227 A1 5/2007 Dembo et al.
2007/0129978 A1 6/2007 Shirasu et al.
2007/0132585 A1 6/2007 Llorca et al.
2007/0150387 A1 6/2007 Seubert et al.
2007/0150836 A1 6/2007 Deggelmann et al.
2007/0156428 A1 7/2007 Brecht-Tillinger et al.
2007/0156545 A1 7/2007 Lin
2007/0156552 A1 7/2007 Manganiello
2007/0156690 A1 7/2007 Moser et al.
2007/0165622 A1 7/2007 O'Rourke et al.
2007/0174811 A1 7/2007 Kaetker et al.
2007/0214065 A1* 9/2007 Kahlon et al. .................. 705/28
2007/0219864 A1 9/2007 Vollrath et al.
2007/0225949 A1 9/2007 Sundararajan et al.
2007/0226066 A1 9/2007 Brunner et al.
2007/0226090 A1 9/2007 Stratton
2007/0255639 A1 11/2007 Seifert
2007/0265860 A1 11/2007 Herrmann et al.
2007/0265862 A1 11/2007 Freund et al.
2007/0288250 A1 12/2007 Lemcke et al.
2007/0294159 A1 12/2007 Cottle
2007/0295803 A1 12/2007 Levine et al.
2008/0005012 A1 1/2008 Deneef
2008/0016242 A1 1/2008 Panec et al.
2008/0021754 A1 1/2008 Horn et al.
2008/0040243 A1 2/2008 Chang et al.
2008/0046104 A1 2/2008 Van Camp et al.
2008/0046421 A1 2/2008 Bhatia et al.
2008/0065443 A1 3/2008 Gorur et al.
2008/0120129 A1 5/2008 Seubert et al.
2008/0120190 A1 5/2008 Joao et al.
2008/0120204 A1 5/2008 Conner et al.
2008/0120313 A1 5/2008 O'Brien et al.
2008/0133303 A1 6/2008 Singh et al.
2008/0144791 A1 6/2008 Harifi et al.
2008/0154969 A1 6/2008 DeBie
2008/0162266 A1 7/2008 Griessmann et al.
2008/0184265 A1 7/2008 Kasi et al.
2008/0189360 A1 8/2008 Kiley et al.
2008/0196108 A1 8/2008 Dent et al.
2008/0215354 A1 9/2008 Halverson et al.
2008/0243578 A1 10/2008 Veit
2008/0288317 A1 11/2008 Kakar
2008/0300962 A1 12/2008 Cawston et al.
2009/0006203 A1 1/2009 Fordyce et al.
2009/0063287 A1 3/2009 Tribout et al.
2009/0077074 A1 3/2009 Hosokawa
2009/0089198 A1 4/2009 Kroutik
2009/0094274 A1 4/2009 Gorelik et al.
2009/0164497 A1 6/2009 Steinmaier et al.
2009/0192926 A1 7/2009 Tarapata
2009/0193432 A1 7/2009 McKegney et al.

| | | | |
|---|---|---|---|
| 2009/0222360 | A1 | 9/2009 | Schmitt et al. |
| 2009/0248429 | A1 | 10/2009 | Doenig et al. |
| 2009/0248430 | A1 | 10/2009 | Hubert et al. |
| 2009/0248431 | A1 | 10/2009 | Schoknecht et al. |
| 2009/0248463 | A1 | 10/2009 | Piochon et al. |
| 2009/0248473 | A1 | 10/2009 | Doenig et al. |
| 2009/0248487 | A1 | 10/2009 | Santoso et al. |
| 2009/0248547 | A1 | 10/2009 | Doenig et al. |
| 2009/0248558 | A1 | 10/2009 | Hollberg et al. |
| 2009/0248586 | A1 | 10/2009 | Kaisermayr et al. |
| 2009/0248698 | A1 | 10/2009 | Rehmann |
| 2009/0249358 | A1 | 10/2009 | Schuette |
| 2009/0249362 | A1 | 10/2009 | Lindemann et al. |
| 2009/0254971 | A1 | 10/2009 | Herz et al. |
| 2009/0271245 | A1 | 10/2009 | Joshi et al. |
| 2009/0276338 | A1 | 11/2009 | Masermann et al. |
| 2009/0300578 | A1 | 12/2009 | Neil |
| 2009/0326988 | A1 | 12/2009 | Barth et al. |
| 2009/0327009 | A1 | 12/2009 | Schmitt et al. |
| 2009/0327105 | A1 | 12/2009 | Moussa et al. |
| 2009/0327106 | A1 | 12/2009 | Bartelt et al. |
| 2010/0001834 | A1 | 1/2010 | Brunswig et al. |
| 2010/0014510 | A1 | 1/2010 | Boreli et al. |
| 2010/0070391 | A1 | 3/2010 | Storr et al. |
| 2010/0070395 | A1 | 3/2010 | Elkeles et al. |
| 2010/0106555 | A1 | 4/2010 | Mneimneh et al. |
| 2010/0131379 | A1 | 5/2010 | Dorais et al. |
| 2010/0131394 | A1 | 5/2010 | Rutsch et al. |
| 2010/0153297 | A1 | 6/2010 | Haaf et al. |
| 2010/0161366 | A1 | 6/2010 | Clemens et al. |
| 2010/0161425 | A1 | 6/2010 | Sideman |
| 2010/0169888 | A1 | 7/2010 | Hare et al. |
| 2010/0198631 | A1 | 8/2010 | Edwards et al. |
| 2010/0217645 | A1 | 8/2010 | Jin et al. |
| 2010/0217820 | A1 | 8/2010 | Brouk et al. |
| 2010/0218245 | A1 | 8/2010 | Brouk et al. |
| 2010/0241729 | A1 | 9/2010 | Angelov |
| 2010/0306536 | A1 | 12/2010 | Brouk et al. |
| 2011/0046775 | A1 | 2/2011 | Bailey et al. |
| 2011/0077999 | A1 | 3/2011 | Becker et al. |
| 2011/0078048 | A1 | 3/2011 | Becker et al. |
| 2011/0088000 | A1 | 4/2011 | Mackay |
| 2011/0153767 | A1 | 6/2011 | Coldicott et al. |
| 2011/0276636 | A1 | 11/2011 | Cheng et al. |
| 2011/0307289 | A1 | 12/2011 | Hosur et al. |
| 2011/0307353 | A1 | 12/2011 | Ringl et al. |
| 2012/0118983 | A1 | 5/2012 | Harris |

FOREIGN PATENT DOCUMENTS

| | | |
|---|---|---|
| CN | 1501296 | 6/2004 |
| CN | 1609866 | 4/2005 |
| CN | 1632806 | 6/2005 |
| CN | 1765138 | 4/2006 |
| CN | 1767537 | 5/2006 |
| CN | 101174957 | 5/2008 |
| CN | 101288092 | 10/2008 |
| WO | WO 2008/005102 | 1/2008 |

OTHER PUBLICATIONS

Jeff Kravitz, FSML-Financial Services markup Language, Financial Services Technology Consortium, Jul. 14, 1999, pp. 1-158 http://xml.coverpages.org/FSML-v1500a.pdf.*

UML in the .com Enterprise: Modeling CORBA, Components, XML/XMI and Metadata Workshop, http://www.omg.org/news/meetings/workshops/uml_presentations.htm.

Brahim Medjahed, et al., Business-to-business interactions: issues and enabling technologies, The VLDB Journal, Apr. 3, 2003, pp. 59-85, vol. 12, No. 1, Springer-Verlag New York, Inc.

Brahim Medjahed, et al., Composing Web Services on the Semantic Web, The VLDB Journal, Sep. 23, 2003, pp. 333-351, vol. 12, No. 4, Springer-Verlag New York, Inc.

Marc Born, et al., Customizing UML for Component Design, www.dot-profile.de, UML Workshop—Palm Springs, CA, Nov. 2000.

Gerti Kappel, et al., A Framework for Workflow Management Systems Based on Objects, Rules and Roles, ACM Comput. Surv., Mar. 2000, p. 27, vol. 32, ACM Press.

Aaron Skonnard, et al., BizTalk Server 2000: Architecture and Tools for Trading Partner Integration, 2000, ms-help://MS.MSDNQTR.2003APR.1033/dnmag00/htmal/biztalk.htm.

Microsoft, Creating an XML Web Service Proxy, 2001, mshelp://MS.MSDNQTR.2003APR.1033/cpguide/html/cpconcreatingwebserviceproxy.htm.

Proceedings of OMG Workshops, pp. 1-3, http://www.omg.org/news/meetings/workshops/proceedings.htm.

Bart Meltzer, et al., XML and Electronic Commerce: Enabling the Network Economy, SIGMOD Record, Dec. 1998, pp. 21-24, vol. 27, No. 4, ACM Press.

Michael N. Huhns, et al., Automating Supply-Chain Management, Jul. 15-19, 2002, pp. 1017-1024.

Eva Soederstroem, Standardising the business vocabulary of standards, 2002, pp. 1048-1052, SAC, Madrid, Spain.

Remi Bastide, et al., Formal Specification of CORBA Services: Experience and Lessons Learned, 2000, pp. 105-117.

Robert J. Glushko, et al., An XML Framework for Agent-based E-commerce, Mar. 1999, pp. 106-114, vol. 42, No. 3.

Alberto Coen-Porisini, et al., A Formal Approach for Designing CORBA-Based Applications, ACM Transactions on Software Engineering and Methodology, Apr. 2003, pp. 107-151, vol. 12, No. 2.

J. Yang, et al., Service Deployment for Virtual Enterprises, 2001, pp. 107-115.

Alan H. Karp, E-Speak E-xplained, Communications of the ACM, Jul. 2003, pp. 113-119, vol. 46, No. 7, ACM Press.

David Gillibrand, Essential Business Object Design, Communication of the ACM, Feb. 2000, pp. 117-119, vol. 43, No. 2, ACM Press.

James Cole, et al., Extending Support for Contracts in ebXML, 2001, pp. 119-127.

Elisabetta DiNitto, et al., Deriving Executable Process Descriptions from UML, May 19-25, 2002, pp. 155-165.

Markus Stumptner, et al., On the Road to Behavior-Based Integration, CRPIT '31: Proceedings of the First Asian-Pacific Conference on Conceptual Modeling, Jan. 2004, pp. 15-22, Australian Computer Society, Inc., Dunedin, New Zealand.

Sanjay Gosain, et al., The Impact of Common E-Business Interfaces, Communication of the ACM, Dec. 2003, pp. 186-195, vol. 46, No. 12, ACM Press.

Suresh Damodaran, B2B Integration over the Internet with XML—RosettaNet Successes and Challenges, May 17-22, 2004, pp. 188-195.

Wolfgang Schulze, et al., Standardising on Workflow-Management—The OMG Workflow Management Facility, SIGGROUP Bulletin, Apr. 1998, pp. 24-30, vol. 19, No. 1, ACM Press.

Jeff Sutherland, Business Objects in Corporate Information Systems, ACM Computing Surveys, Jun. 1995, pp. 274-276, vol. 27, No. 2.

Ali Arsanjani, Developing and Integrating Enterprise Components and Services, Communications of the ACM, Oct. 2002, pp. 31-34, vol. 45, No. 10, ACM Press.

Dan Jong Kim, et al., A Comparison of B2B E-Service Solutions, Communications of the ACM, Dec. 2003, pp. 317-324, vol. 46, No. 12, ACM Press.

Wilhelm Hasselbring, Information System Integration, Communication of the ACM, Jun. 2000, pp. 33-38, vol. 43, No. 6, ACM Press.

Navid Khosravi, et al., An Approach to Building Model Driven Enterprise Systems in Nebras Enterprise Framework, OOPSLA '02: Companion of the 17th Annual ACM SIGPLAN Conference on Object-Oriented Programming, Systems, Languages, and Applications, Nov. 4-8, 2002, pp. 32-33, ACM Press, Seattle, Washington.

K. Hogg, et al., An Evaluation of Web Services in the Design of a B2B Application, 2004, pp. 331-340.

Volker Gruhn, Workflow Management based on Process Model Repositories, 1998, pp. 379-388.

Hyoungdo Kim, Conceptual Modeling and Specification Generation for B2B Business Processes Based on ebXML, SIGMOD Record, Mar. 2002, pp. 37-42, vol. 31, No. 1, ACM Press.

Jon Siegel, OMG Overview: CORBA and the OMA in Enterprise Computing, Communications of the ACM, Oct. 1998, pp. 37-43, vol. 41, No. 10, ACM Press.

Jian Yang, et al., Interoperation Support for Electronic Business, Communication of the ACM, Jun. 2000, pp. 39-47, vol. 43, No. 6, ACM Press.

Keith Levi, et al., A Goal-Driven Approach to Enterprise Component Identification and Specification, Communication of the ACM, Oct. 2002, pp. 45-52, vol. 45, No. 10, ACM Press.
Koichi Terai, et al., Coordinating Web Services Based on Business Models, 2003, pp. 473-478.
Lerina Aversano, et al., Introducing eServices in Business Process Models, Jul. 15-19, 2002, pp. 481-488.
Christoph Quix, et al., Business Data Management for Business-to-Business Electronic Commerce, SIGMOD Record, Mar. 2002, pp. 49-54, vol. 31, No. 1, ACM Press.
Jeff Sutherland, Why I Love the OMG: Emergence of a Business Object Component Architecture, StandardView, Mar. 1998, pp. 4-13, vol. 6, No. 1, ACM Press.
Asuman Dogac, et al., An ebXML Infrastructure Implementation through UDDI Registries and RosettaNet PIPs, Jun. 4-6, 2002, pp. 512-523.
Jinyoul Lee, et al., Enterprise Integration with ERP and EAI, Communications of the ACM, Feb. 2003, pp. 54-60, vol. 46, No. 2, ACM Press.
Lars G. Bratthall, et al., Integrating Hundred's of Products through One Architecture—The Industrial IT Architecture, May 19-25, 2002, pp. 604-614.
Peter Fingar, Component-Based Frameworks for E-Commerce, Communications of the ACM, Oct. 2000, pp. 61-66, vol. 43, No. 10, ACM Press.
David Sprott, Componentizing the Enterprise Application Packages, Communications of the ACM, Apr. 2000, pp. 63-69, vol. 43, No. 4, ACM Press.
Aniruddha Gokhale, et al., Applying Model-Integrated Computing to Component Middleware and Enterprise Applications, Communications of the ACM, Oct. 2002, pp. 65-70, vol. 45, No. 10, ACM Press.
Christoph Bussler, The Role of B2B Engines in B2B Integration Architectures, SIGMOD Record, Mar. 2002, pp. 67-72, vol. 31, No. 1, ACM Press.
Ning He, et al., B2B Contract Implementation Using Windows DNS, 2001, pp. 71-79.
Paul Fremantle, et al., Enterprise Services, Communications of the ACM, Oct. 2002, pp. 77-82, vol. 45, No. 10, ACM Press.
David Trastour, et al., Semantic Web Support for the Business-to-Business E-Commerce Lifecycle, May 7-11, 2002, pp. 89-98.
Dirk Jaeger, et al., Using UML for Software Process Modeling, pp. 91-108.
Zaw Z. Han, et al., Interoperability from Electronic Commerce to Litigation Using XML Rules, 2003, pp. 93-94.
David A. Carlson, Designing XML Vocabularies with UML, 2000, pp. 95-96.
Michael Stonebraker, Too Much Middleware, SIGMOD Record, Mar. 2002, pp. 97-106, vol. 31, No. 1, ACM Press.
Zakaria Maamar, et al., Toward Intelligent Business Objects, Communications of the ACM, Oct. 2000, pp. 99-101, vol. 43, No. 10, ACM Press.
Jay M. Tenenbaum, et al., Eco System: An Internet Commerce Architecture, 1997, pp. 48-55.
Anat Eyal, et al., Integrating and Customizing Heterogeneous E-Commerce Applications, The VLDB Journal, Aug. 2001, pp. 16-38, vol. 10, No. 1, Springer-Verlag New York, Inc.
Zencke, Peter: "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf ; 36 pages.
"UML in the .com Enterprise: Modeling CORBA, Components, XML/XMI and Metadata Workshop"; http://www.omg.org/news/meetings/workshops/uml_presentations.htm.
Medjahed, Brahim et al; "Business-to-Business Interactions: Issues and Enabling Technologies"; The VLDB Journal; vol. 12, No. 1; Apr. 3, 2003; pp. 59-89.
Meltzer, Bart et al.; "XML and Electronic Commerce: Enabling the Network Economy"; SIGMOD Record; ACM Press; vol. 27, No. 4; Dec. 1998; pp. 21-24.
Huhns, Michael N. et al.; "Automating Supply-Chain Mangement"; Jul. 15-19, 2002; pp. 1017-1024.
Soederstroem, Eva; "Standardising the Business Vocabulary of Standards"; SAC, Madrid, Spain; 2002; pp. 1048-1052.
Bastide, Remi et al.; "Formal Specification of CORBA Services: Experience and Lessons Learned"; 2000; pp. 105-117.
Glushko, Robert J. et al.; "An XML Framework for Agent-Based E-Commerce"; Communications of the ACM; vol. 42, No. 3; Mar. 1999; pp. 106-114.
Coen-Porisini, Alberto et al.; "A Formal Approach for Designing CORBA-Based Applications"; ACM Transactions on Software Engineering and Methodology; vol. 12, No. 2; Apr. 2003; pp. 107-151.
Yang, J. et al.; "Service Deployment for Virtual Enterprises"; IEEE; 2001; pp. 107-115.
Karp, Alan H.; "E-speak E-xplained"; Communications of the ACM; vol. 46, No. 7; Jul. 2003; pp. 113-118.
Gillibrand, David; "Essential Business Object Design"; Communications of the ACM; vol. 43, No. 2; Feb. 2000; pp. 117-119.
Cole, James et al.; "Extending Support for Contracts in ebXML"; IEEE; 2001; pp. 119-127.
DiNitto, Elisabetta et al.; "Deriving Executable Process Descriptions from UML"; ICSE '02; May 19-25, 2002; pp. 155-165.
Stumptner, Markus et al.; "On the Road to Behavior-Based Integration"; First Asia-Pacific Conferences on Conceptual Modelling; Dunedin, New Zealand; Jan. 2004; pp. 15-22.
Gosain, Sanjay et al.; "The Impact of Common E-Business Interfaces"; Communications of the ACM; vol. 46, No. 2; Dec. 2003; pp. 186-195.
Damodaran, Suresh; "B2B Integration over the Internet with XML—RosettaNet Successes and Challenges"; WWW2004; May 17-22, 2004; pp. 188-195.
Schulze, Wolfgang et al.; "Standardising on Workflow-Management—The OMG Workflow Management Facility"; SIGGROUP Bulletin; vol. 19, No. 1; Apr. 1998; pp. 24-30.
Sutherland, Jeff; "Business Objects in Corporate Information Systems"; ACM Computing Surveys; vol. 27, No. 2; Jun. 1995; pp. 274-276.
Arsanjani, Ali; "Developing and Integrating Enterprise Components and Services"; Communications of the ACM; vol. 45, No. 10; Oct. 2002; pp. 31-34.
Kim, Dan Jong et al.; "A Comparison of B2B E-Service Solutions"; Communications of the ACM; vol. 46, No. 12; Dec. 2003; pp. 317-324.
Hasselbring, Wilhelm; "Information System Integration"; Communications of the ACM; vol. 43, No. 6; Jun. 2000; pp. 33-38.
Khosravi, Navid et al.; "An Approach to Building Model Driven Enterprise Systems in Nebras Enterprise Framework"; OOPSLA '02: Companion of the 17$^{th}$ Annual ACM SIGPLAN Conference on Object-Oriented Programming, Systems, Languages, and Applications; Nov. 4-8, 2002; pp. 32-33.
Hogg, K. et al.; "An Evaluation of Web Services in the Design of a B2B Application"; 27$^{th}$ Australasian Computer Science Conference; Dunedin, New Zealand; 2004; pp. 331-340.
Gruhn, Volker et al.; "Workflow Management Based on Process Model Repositories"; IEEE 1998; pp. 379-388.
Kim, HyoungDo; "Conceptual Modeling and Specification Generation for B2B Business Processes Based on ebXML"; SIGMOD Record; vol. 31, No. 1; Mar. 2002; pp. 37-42.
Siegel, Jon; "OMG Overview: CORBA and the OMA in Enterprise Computing"; Communications of the ACM; vol. 41, No. 10; Oct. 1998; pp. 37-43.
Sutherland, Jeff; "Why I Love the OMG: Emergence of a Business Object Component Architecture"; StandardView; vol. 6, No. 1; Mar. 1998; pp. 4-13.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Bratthall, Lars G. et al.; "Integrating Hundreds of Products through One Architecture—The Industrial IT Architecture"; ICSE '02; Orlando, Florida; May 19-25, 2002; pp. 604-614.
Trastour, David et al.; "Semantic Web Support for the Business-to-Business E-Commerce Lifecycle"; WWW2002, Honolulu, Hawaii; May 7-11, 2002; pp. 89-98.
Jaeger, Dirl et al.; "Using UML for Software Process Modeling"; pp. 91-108.

Carlson, David A.; "Designing XML Vocabularies with UML"; OOPSLA 2000 Companion; Minneapolis, Minnesota; 2000; pp. 95-96.
Maamar, Zakaria et al.; "Toward Intelligent Business Objects"; Communications of the ACM; vol. 43, No. 10; Oct. 2000; pp. 99-101.
Tenenbaum, Jay M. et al.; "Eco System: An Internet Commerce Architecture"; IEEE: May 1997; pp. 48-55.
Eyal, Anat et al.; "Integrating and Customizing Heterogeneous E-Commerce Applications"; The VLDB Journal; Aug. 2001; pp. 16-38.
Office Action issued in related U.S. Appl. No. 11/145,464 on Jan. 22, 2009; 49 pages.
International Search Report and Written Opinion of the International Searching Authority issued in International Application No. PCT/US2007/011378 on Apr. 30, 2008; 17 pages.
International Preliminary Report on Patentability under Chapter 1 issued in International Application No. PCT/US2007/011378 on Nov. 17, 2008; 11 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter 1 issued in International Application No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter 1 issued in International Application No. PCT/US2005/021481 on Dec. 20, 2006; 6 pages.
International Preliminary Report on Patentability under Chapter 1 issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter 1 issued in International Application No. PCT/US2005/022137 on Dec. 28, 2006; 5 pages.
He, Ning et al.; "B2B Contract Implementation Using Windows DNS"; 2001; pp. 71-79.
Webster's Revised Unabridged Dictionary (1913+1828); Def. "merchandise".
Statement in Accordance with the Notice from the European Patent Office dated Oct. 1, 2007 Concerning Business Methods—EPC; Official Journal of the European Patent Office; Munich; Nov. 1, 2007; pp. 592-593.
Lynn, Chris; "Sony Enters Brand Asset Management Market"; The Seybold Report; Analyzing Publishing Technologies; Aug. 4, 2004; <www.Seybold365.com>; 3 pages.
Office Action issued in related U.S. Appl. No. 11/640,422 on Apr. 2, 2009; 13 pages.
Office Action issued in related U.S. Appl. No. 11/640,422 on Dec. 30, 2009; 9 pages.
Office Action issued in related U.S. Appl. No. 11/803,178 on Jun. 29, 2009; 5 pages.
Office Action issued in related U.S. Appl. No. 11/803,178 on Mar. 4, 2010; 43 pages.
Office Action issued in related U.S. Appl. No. 11/775,821 on Jan. 22, 2010; 16 pages.
Office Action issued in related U.S. Appl. No. 11/364,538 on Aug. 4, 2009; 5 pages.
Office Action issued in related U.S. Appl. No. 11/364,538 on Mar. 4, 2010; 40 pages.
Office Action issued in related U.S. Appl. No. 11/731,857 on May 15, 2009; 11 pages.
Office Action issued in related U.S. Appl. No. 11/731,857 on Feb. 4, 2010; 22 pages.
Office Action issued in related U.S. Appl. No. 11/864,786 on Jun. 22, 2009; 7 pages.
Office Action issued in related U.S. Appl. No. 11/864,786 on Mar. 3, 2010; 12 pages.
Office Action issued in related U.S. Appl. No. 11/864,832 on Sep. 18, 2009; 14 pages.
Notice of Allowance issued in related U.S. Appl. No. 11/864,832 on Mar. 24, 2010; 11 pages.
Office Action issued in related U.S. Appl. No. 11/864,871 on Apr. 21, 2010; 20 pages.
Office Action issued in related U.S. Appl. No. 12/059,867 on Aug. 18, 2009; 37 pages.
Office Action issued in related U.S. Appl. No. 12/059,867 on Feb. 22, 2010; 24 pages.
Office Action issued in related U.S. Appl. No. 12/060,178 on Dec. 7, 2009; 6 pages.
Office Action issued in related U.S. Appl. No. 12/060,171 on Aug. 11, 2009; 11 pages.
Office Action issued in related U.S. Appl. No. 12/060,171 on Mar. 19, 2010; 10 pages.
Office Action issued in related U.S. Appl. No. 11/145,464 on Aug. 5, 2009; 31 pages.
Office Action issued in related U.S. Appl. No. 11/145,464 on Feb. 5, 2010; 57 pages.
Office Action issued in related U.S. Appl. No. 11/166,065 on Jun. 24, 2009; 6 pages.
Office Action issued in related U.S. Appl. No. 11/166,065 on Mar. 3, 2010; 25 pages.
Communication Pursuant to Article 94(3) EPC issued in related European Application No. 05757432.9 on Jan. 26, 2009; 4 pages.
Supplementary European Search Report issued in related European Application No. 05823434.5 on Sep. 28, 2009; 3 pages.
Supplementary European Search Report issued in related European Application No. 05766672.9 on Oct. 6, 2009; 3 pages.
"Header", Newton's Telecom Dictionary; 12th Edition, 2004; pp. 389-390.
Newton's Telecom Dictionary; 18th Edition; 2002; pp. 347, 454.
Notice of Allowance issued in related U.S. Appl. No. 12/147,395 on Oct. 26, 2010; 10 pages.
Office Action issued in U.S. Appl. No. 11/640,422 on May 14, 2010; 12 pages.
Notice of Allowance issued in related U.S. Appl. No. 11/775,821 on Jul. 16, 2010; 4 pages.
Notice of Allowance issued in related U.S. Appl. No. 11/775,821 on Oct. 22, 2010; 4 pages.
Notice of Allowance issued in related U.S. Appl. No. 11/364,538 on Dec. 13, 2010; 5 pages.
Notice of Allowance issued in related U.S. Appl. No. 11/731,857 on Nov. 29, 2010; 4 pages.
Notice of Allowance issued in related U.S. Appl. No. 11/864,832 on Aug. 23, 2010; 4 pages.
Notice of Allowance issued in related U.S. Appl. No. 11/864,832 on Dec. 3, 2010; 9 pages.
Office Action issued in related U.S. Appl. No. 11/864,871 on Oct. 1, 2010; 30 pages.
Office Action issued in related U.S. Appl. No. 12/059,971 on Nov. 4, 2010; 20 pages.
Office Action issued in related U.S. Appl. No. 12/060,149 on Aug. 26, 2010; 15 pages.
Office Action issued in related U.S. Appl. No. 12/060,178 on May 25, 2010; 19 pages.
Notice of Allowance issued in related U.S. Appl. No. 12/060,178 on Dec. 6, 2010; 4 pages.
Office Action issued in related U.S. Appl. No. 12/060,171 on Jul. 1, 2010; 19 pages.
Notice of Allowance issued in related U.S. Appl. No. 11/145,464 on Nov. 1, 2010; 4 pages.
Notice of Allowance issued in related U.S. Appl. No. 11/166,065 on Sep. 20, 2010; 6 pages.

Baker, Stacy; "Benefits of Assortment Planning"; Assortment Planning for Apparel Retailers—2005 Management Briefing; Just Style; Jun. 2005; 3 pages.
"Visual and Quantitative Assortment Planning Applications Drive Partnership and Profit"; PR Newswire; Jan. 12, 2006; 3 pages.
"DOTS Inc. Selects Compass Software's smartmerchandising for Merchandise Planning and Assortment Planning"; PR Newswire; Dec. 11, 2002; 2 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Communication Pursuant to Rules 70(2) and 70a(2) EPC issued in related European Application No. 07835755.5 on Feb. 28, 2011; 6 pages.
Notice of Allowance issued in related U.S. Appl. No. 12/147,449 on Apr. 28, 2011; 9 pages.
Office Action issued in related U.S. Appl. No. 12/147,399 on Jan. 26, 2011; 16 pages.
Notice of Allowance issued in related U.S. Appl. No. 11/731,857 on Apr. 11, 2011; 8 pages.
Office Action issued in U.S. Appl. No. 12/147,414 on Apr. 14, 2011; 30 pages.
Notice of Allowance issued in U.S. Appl. No. 12/323,139 on Mar. 4, 2011; 13 pages.
Office Action issued in related U.S. Appl. No. 12/059,971 on May 18, 2011; 13 pages.
Office Action issued in related U.S. Appl. No. 12/059,804 on Apr. 28, 2011; 14 pages.
Office Action issued in related U.S. Appl. No. 12/060,149 on Feb. 4, 2011; 19 pages.
Office Action issued in related U.S. Appl. No. 12/060,192 on Apr. 14, 2011; 18 pages.
Office Action issued in related U.S. Appl. No. 12/060,155 on May 10, 2011; 8 pages.
Office Action issued in related U.S. Appl. No. 12/060,171 on Jan. 26, 2011; 17 pages.
Notice of Allowance issued in related U.S. Appl. No. 11/145,464 on Feb. 23, 2011; 7 pages.
Notice of Allowance issued in U.S. Appl. No. 11/166,065 on Mar. 8, 2011; 5 pages.
Office Action issued in related U.S. Appl. No. 11/864,866 on Feb. 3, 2011; 20 pages.
Notice of Allowance issued in related U.S. Appl. No. 11/775,821 on Feb. 4, 2011; 4 pages.
Office Action issued in U.S. Appl. No. 11/864,811 on Mar. 18, 2011; 10 pages.
SAP; "BC-Central Maintenance and Transport Objects"; Release 4.6C; Apr. 2001; 15 pages.
Annevelink et al.; "Heterogeneous Database Intergration in a Physician Workstation"; 1992; 5 pages.
Ketabchi et al.; "Object-Oriented Database Management Support for Software Maintenance and Reverse Engineering"; Department of Electrical Engineering and Computer Science, Santa Clara University; 1989; 4 pages.
Diehl et al.; "Service Architecture for an Object-Oriented Next Generation Profile Register"; date unknown; 8 pages.
Communication Pursuant to Article 94(3) issued in European Application No. 05757432.9 on Apr. 12, 2011; 5 pages.
Communication Pursuant to Article 94(3) issued in European Application No. 05766672.9 on Jul. 14, 2011; 4 pages.
Notice of Allowance issued in U.S. Appl. No. 12/147,395 on May 4, 2011; 10 pages.
Office Action issued in related U.S. Appl. No. 12/334,175 on May 27, 2011; 12 pages.
Notice of Allowance issued in related U.S. Appl. No. 11/731,857 on Dec. 14, 2011; 7 pages.
Office Action issued in U.S. Appl. No. 12/147,414 on Oct. 26, 2011; 27 pages.
Office Action issued in U.S. Appl. No. 12/147,378 on Jun. 17, 2011; 10 pages.
Notice of Allowance issued in U.S. Appl. No. 12/147,378 on Nov. 9, 2011; 16 pages.
Office Action issued in U.S. Appl. No. 12/323,116 on Sep. 6, 2011; 8 pages.
Office Action issued in U.S. Appl. No. 12/571,140 on Sep. 26, 2011; 14 pages.
Office Action issued in related U.S. Appl. No. 12/060,054 on Jun. 29, 2011; 15 pages.
Office Action issued in related U.S. Appl. No. 12/060,054 on Dec. 7, 2011; 15 pages.
Office Action issued in U.S. Appl. No. 12/060,144 on Jun. 23, 2011; 16 pages.
Office Action issued in U.S. Appl. No. 12/060,144 on Dec. 8, 2011; 18 pages.
Office Action issued in U.S. Appl. No. 12/059,804 on Nov. 14, 2011; 15 pages.
Office Action issued in related U.S. Appl. No. 12/059,860 on Aug. 3, 2011; 15 pages.
Office Action issued in related U.S. Appl. No. 12/060,192 on Sep. 6, 2011; 18 pages.
Notice of Allowance issued in related U.S. Appl. No. 12/060,178 on Sep. 2, 2011; 9 pages.
Office Action issued in related U.S. Appl. No. 12/060,062 on Jul. 13, 2011; 16 pages.
Office Action issued in related U.S. Appl. No. 12/060,155 on Oct. 31, 2011; 15 pages.
Office Action issued in U.S. Appl. No. 12/815,698 on Jan. 20, 2012; 10 pages.
Office Action issued in U.S. Appl. No. 12/815,618 on Dec. 22, 2011; 8 pages.
Notice of Allowance issued in related U.S. Appl. No. 11/864,866 on Jul. 22, 2011; 6 pages.
Notice of Allowance issued in U.S. Appl. No. 11/775,821 on Sep. 21, 2011; 5 pages.
Notice of Allowance issued in U.S. Appl. No. 11/775,821 on Dec. 30, 2011; 5 pages.
Notice of Allowance issued in related U.S. Appl. No. 11/364,538 on Jul. 26, 2011; 6 pages.
Office Action issued in U.S. Appl. No. 11/864,811 on Jul. 26, 2011; 7 pages.
Notice of Allowance issued in U.S. Appl. No. 11/864,811 on Nov. 14, 2011; 8 pages.
Notice of Allowance issued in related U.S. Appl. No. 11/864,832 on Jul. 7, 2011; 11 pages.
Office Action issued in related U.S. Appl. No. 11/864,863 on Jul. 21, 2011; 29 pages.
Office Action issued in related U.S. Appl. No. 11/864,863 on Dec. 22, 2011; 20 pages.
Notice of Allowance issued in related U.S. Appl. No. 11/803,178 on May 17, 2011; 13 pages.
Notice of Allowance issued in U.S. Appl. No. 11/640,422 on Sep. 29, 2011; 7 pages.
Altintas et al.; "Aurora Software Product Line"; Cybersoft Information Technologies Co.; 2005; pp. 1-8.
Boetterweck, Goetz; "A Model-Driven Approach to the Engineering of Multiple User Interfaces"; Lecture Notes in Computer Science; 2007; vol. 4364/2007; pp. 106-115.
Gable, Julie; "Enterprise Application Integration"; Information Management Journal; Mar./Apr. 2002; pp. 48-52.
Himoff et al.; "MAGENTA Technology: Multi-Agent Systems for Industrial Logistics"; AAMAS'05; Jul. 25-29, 2005; 2005 ACM; pp. 60-66:1-7).
Lockemann et al.; "Flexibility through Multi-Agent Systems: Solutions or Illusions"; SOFSEM 2004; pp. 41-56.
Mascolo et al.; "An Analytical Method for Performance Evaluation of Kanban Controlled Production Systems"; Operations Research; vol. 44, No. 1; 1996; pp. 50-64.
SAP 2008 Annual Report; 256 pages.

"SAP Labs and HP Team to Advance Internet-Based Supply Chain Collaboration"; Business Editors and Technology Writers; Business Wire; New York; Feb. 3, 2000; 4 pages.
Shi, Min-Hua et al.; "MQML-Message Queuing Markup Language"; Proceedings of the 4th IEEE International Workshop on Advanced Issues of E-Commerce and Web-Based Information Systems (WECWIS 2002); 2002; 8 pages.
Communication Pursuant to Article 94(3) EPC issued in European Application No. 07835755.5 on Feb. 22, 2012; 7 pages.
International Search Report and Written Opinion issued in International Application No. PCT/CN2011/001238 on May 3, 2012; 9 pages.
Notice of Allowance issued in related U.S. Appl. No. 11/864,866 on Mar. 13, 2012; 7 pages.
Notice of Allowance issued in related U.S. Appl. No. 11/145,464 on Feb. 6, 2012; 7 pages.
Notice of Allowance issued in related U.S. Appl. No. 11/364,538 on Jul. 13, 2012; 7 pages.
Notice of Allowance issued in related U.S. Appl. No. 11/803,178 on Jul. 17, 2012; 15 pages.
Notice of Allowance issued in related U.S. Appl. No. 11/864,832 on Jan. 9, 2012; 12 pages.
Notice of Allowance issued in related U.S. Appl. No. 11/864,832 on Jul. 30, 2012; 12 pages.
Notice of Allowance issued in U.S. Appl. No. 11/166,065 on Feb. 15, 2012; 7 pages.
Notice of Allowance issued in U.S. Appl. No. 11/640,422 on May 22, 2012; 7 pages.
Notice of Allowance issued in U.S. Appl. No. 11/864,811 on Sep. 10, 2012; 10 pages.
Notice of Allowance issued in U.S. Appl. No. 11/864,811 on Mar. 2, 2012; 8 pages.
Notice of Allowance issued in U.S. Appl. No. 12/059,971 on Jun. 28, 2012; 12 pages.
Notice of Allowance issued in U.S. Appl. No. 12/060,062 on Mar. 20, 2012; 16 pages.
Notice of Allowance issued in U.S. Appl. No. 12/060,155 on Apr. 24, 2012; 15 pages.
Notice of Allowance issued in U.S. Appl. No. 12/060,192 on Mar. 2, 2012; 18 pages.
Notice of Allowance issued in U.S. Appl. No. 12/147,378 on Aug. 31, 2012; 9 pages.
Notice of Allowance issued in U.S. Appl. No. 12/323,116 on Jun. 11, 2012; 10 pages.
Notice of Allowance issued in U.S. Appl. No. 12/323,139 on Mar. 14, 2012; 10 pages.
Notice of Allowance issued in U.S. Appl. No. 12/571,140 on Mar. 20, 2012; 16 pages.
Notice of Allowance issued in U.S. Appl. No. 12/815,618 on May 10, 2012; 7 pages.
Office Action issued in related U.S. Appl. No. 12/059,860 on Jan. 23, 2012; 16 pages.
Office Action issued in related U.S. Appl. No. 12/060,171 on Mar. 1, 2012; 19 pages.
Office Action issued in U.S. Appl. No. 11/864,786 on Mar. 30, 2012; 12 pages.
Office Action issued in U.S. Appl. No. 12/323,116 on Jan. 27, 2012; 7 pages.
Office Action issued in U.S. Appl. No. 12/571,154 on Apr. 2, 2012; 13 pages.
Office Action issued in U.S. Appl. No. 12/571,154 on Aug. 15, 2012; 15 pages.
Office Action issued in U.S. Appl. No. 12/815,639 on May 24, 2012; 7 pages.
Office Action issued in U.S. Appl. No. 12/815,698 on Jul. 20, 2012; 13 pages.
Office Action issued in U.S. Appl. No. 12/815,750 on Sep. 28, 2012; 6 pages.
Office Action issued in U.S. Appl. No. 12/815,802 on Jul. 20, 2012; 16 pages.
Office Action issued in U.S. Appl. No. 12/816,083 on May 9, 2012; 20 pages.
Office Action issued in U.S. Appl. No. 12/816,170 on Jul. 24, 2012; 9 pages.
Office Action issued in U.S. Appl. No. 12/816,293 on Apr. 25, 2012; 10 pages.
Office Action issued in U.S. Appl. No. 12/815,911 on Sep. 26, 2012; 14 pages.
Office Action issued in U.S. Appl. No. 13/192,543 on Aug. 28, 2012; 14 pages.
Office Action issued in U.S. Appl. No. 13/192,555 on Jul. 20, 2012; 7 pages.
Office Action issued in U.S. Appl. No. 13/349,477 on Jun. 29, 2012; 13 pages.
Business Object DTF, Common Business Objects, Ver 1.5; OMG Document born; Framingham Corporate Center, Framingham, MA; 20 pages; Dec. 4, 1997.
Chou et al. "Web Services for Service-Oriented Communication", International Conference on Collaborative Computing: Networking, Applications and Worksharing, CollaborateCom 2006, pp. 1-8, 2006.
Intersystems, Evaluating Integration Software, Ensemble White Paper, 2007, http://www.intersystems.com/ensemble/whitepapers/pdf/evaluating-integration-software.pdf.
Nemuraite, Lina; "Business Object Modeling Framework for Distributed Enterprise", Kaunas University of Technology, Launas, Lithuania, Jan. 1999; pp. 189-202.
Oracle Application Integration Architecture Enterprise Business Objects (EBO) Concepts—Concepts, Structure, Terminologies and Design Rules, An Oracle White Paper; 29 pages; Aug. 2009.
Notice of Allowance issued in U.S. Appl. No. 11/166,065 on Oct. 9, 2012; 10 pages.
Notice of Allowance issued in U.S. Appl. No. 11/640,422 on Apr. 23, 2012; 8 pages.
Notice of Allowance issued in U.S. Appl. No. 11/731,857 on Oct. 9, 2012; 7 pages.
Notice of Allowance issued in U.S. Appl. No. 11/775,821 on Nov. 2, 2012; 5 pages.
Notice of Allowance issued in U.S. Appl. No. 11/864,786 on Nov. 7, 2012; 7 pages.
Notice of Allowance issued in U.S. Appl. No. 11/864,811 on Mar. 19, 2013; 9 pages.
Notice of Allowance issued in U.S. Appl. No. 11/864,832 on Jul. 3, 2013; 14 pages.
Notice of Allowance issued in U.S. Appl. No. 11/864,866 on Jan. 25, 2013; 7 p pages.
Notice of Allowance issued in U.S. Appl. No. 12/060,062 on Nov. 9, 2012; 7 pages.
Notice of Allowance issued in U.S. Appl. No. 12/060,144 on Mar. 20, 2013; 12 pages.
Notice of Allowance issued in U.S. Appl. No. 12/060,155 on Jan. 11, 2013; 5 pages.
Notice of Allowance issued in U.S. Appl. No. 12/060,171 on Oct. 3, 2012; 10 pages.
Notice of Allowance issued in U.S. Appl. No. 12/060,178 on Feb. 14, 2013; 7 pages.
Notice of Allowance issued in U.S. Appl. No. 12/060,192 on Oct. 29, 2012; 12 pages.
Notice of Allowance issued in U.S. Appl. No. 12/147,395 on Dec. 24, 2012; 11 pages.
Notice of Allowance issued in U.S. Appl. No. 12/323,116 on Jun. 27, 2013; 8 pages.
Notice of Allowance issued in U.S. Appl. No. 12/323,139 on Feb. 8, 2013; 9 pages.
Notice of Allowance issued in U.S. Appl. No. 12/147,414 on Jun. 19, 2013; 23 pages.
Notice of Allowance issued in U.S. Appl. No. 12/571,140 on Nov. 9, 2012; 8 pages.
Notice of Allowance issued in U.S. Appl. No. 12/815,618 on May 7, 2013; 8 pages.
Notice of Allowance issued in U.S. Appl. No. 12/815,639 on Sep. 24, 2012; 9 pages.
Notice of Allowance issued in U.S. Appl. No. 12/815,802 on Nov. 27, 2012; 9 pages.
Notice of Allowance issued in U.S. Appl. No. 12/816,293 on Sep. 19, 2012; 7 pages.

Notice of Allowance issued in U.S. Appl. No. 13/186,361 on Jun. 10, 2013; 11 pages.
Notice of Allowance issued in U.S. Appl. No. 13/192,553 on May 1, 2013; 21 pages.
Notice of Allowance issued in U.S. Appl. No. 13/192,574 on Jun. 14, 2013; 11 pages.
Office Action issued in U.S. Appl. No. 12/815,576 on Feb. 15, 2013; 13 pages.
Office Action issued in U.S. Appl. No. 12/815,576 on Oct. 12, 2012; 11 pages.
Office Action issued in U.S. Appl. No. 12/815,750 on Feb. 21, 2013; 67 pages.
Office Action issued in U.S. Appl. No. 12/815,869 on Feb. 15, 2013; 27 pages.
Office Action issued in U.S. Appl. No. 12/815,911 on Feb. 25, 2013; 15 pages.
Office Action issued in U.S. Appl. No. 12/816,083 on Sep. 21, 2012; 22 pages.
Office Action issued in U.S. Appl. No. 12/816,268 on Apr. 26, 2013; 17 pages.
Office Action issued in U.S. Appl. No. 12/816,268 on Oct. 11, 2012; 11 pages.
Office Action issued in U.S. Appl. No. 12/823,996 on Apr. 25, 2013; 8 pages.
Office Action issued in U.S. Appl. No. 12/823,996 on Mar. 22, 2013, 7 pages.
Office Action issued in U.S. Appl. No. 13/186,361 on Feb. 26, 2013, 10 pages.
Office Action issued in U.S. Appl. No. 13/192,543 on Dec. 13, 2012; 26 pages.
Office Action issued in U.S. Appl. No. 13/192,553 on Feb. 11, 2013, 23 pages.
Office Action issued in U.S. Appl. No. 13/192,555 on Mar. 1, 2013; 11 pages.
Office Action issued in U.S. Appl. No. 13/192,564 on Apr. 22, 2013; 21 pages.
Office Action issued in U.S. Appl. No. 13/192,574 on Apr. 30, 2013; 5 pages.
Office Action issued in U.S. Appl. No. 13/192,574 on Oct. 24, 2012; 6 pages.
Office Action issued in U.S. Appl. No. 13/192,599 on Mar. 21, 2013; 29 pages.
Office Action issued in U.S. Appl. No. 13/192,612 on Oct. 4, 2012; 12 pages.
Office Action issued in U.S. Appl. No. 13/218,876 on Apr. 5, 2013; 10 pages.
Office Action issued in U.S. Appl. No. 13/349,477 on Nov. 15, 2012; 15 pages.
Office Action issued in U.S. Appl. No. 13/535,419 on Apr. 19, 2013; 14 pages.
Office Action issued in U.S. Appl. No. 13/535,433 on Mar. 4, 2013; 11 pages.
Office Action issued in U.S. Appl. No. 13/535,453 on Jul. 5, 2013; 22 pages.
Office Action issued in U.S. Appl. No. 13/535,512 on Jul. 5, 2013; 10 pages.
Office Action issued in U.S. Appl. No. 13/535,521 on Apr. 16, 2013; 16 pages.
Office Action issued in U.S. Appl. No. 13/535,667 on Dec. 26, 2012; 9 pages.
Office Action issued in U.S. Appl. No. 13,535,667 on Jun. 26, 2013; 12 pages.
Office Action issued in U.S. Appl. No. 13/535,674 on Jul. 3, 2013; 17 pages.
Office Action issued in U.S. Appl. No. 13/535,723 on Apr. 24, 2013; 16 pages.
Office Action issued in U.S. Appl. No. 13/535,881 on Dec. 21, 2012; 7 pages.
Office Action issued in U.S. Appl. No. 13/535,864 on May 10, 2013; 9 pages.
Office Action issued in U.S. Appl. No. 13/754,608 on Apr. 215, 2013; 15 pages.
Office Action issued in U.S. Appl. No. 13/535,670 on Jun. 24, 2013; 13 pages.
SAP Structured Entity Relationship Model (SAP-SERM) for R/3 System Release 4.0 Introduction and Index; Dec. 1998; 26 pages.
SAP Structured Entity Relationship Model (SAP-SERM) for R/3 System Release 4.0 (Part 1); Dec. 1998; 5954 pages.
SAP Structured Entity Relationship Model (SAP-SERM) for R/3 System Release 4.0 (Part 2); Dec. 1998; 7838 pages.
Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf; 36 pages.
"UML in the .com Enterprise: Modeling Corba, Components, XML/XMI and Metadata Workshop"; http://www.omg.org/news/meetings/workshops/uml_presentations.htm, Nov. 6, 2000.
Medjahed, Brahim et al: "Business-to-Business Interactions: Issues and Enabling Technologies"; The VLDB Journal; vol. 12, No. 1; Apr. 3, 2003; pp. 59-89.
Medjahed, Brahim et al.; "Composing Web Services on the Semantic Web"; The VLDB Journal; Vol. 12, No. 4, Sep. 23, 2003; pp. 333-351.
Born, Marc et al.; "Customizing UML for Component Design"; www.dot-profile.de; UML Workshop, Palm Springs, CA; Nov. 2000.
Kappel, Gerti et al.; "A Framework for Workflow Management Systems Based on Objects, Rules, and Roles"; ACM Computing Surveys; ACM Press; vol. 32; Mar. 2000; 5 pages.
Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.
Microsoft; "Creating an XML Web Service Proxy"; 2001; mshelp://ms.msdnqtr.2003apr.1033/cpguide/html/cpconcreatingwebserviceproxy.htm; 3 pages.
Proceedings of OMG Workshops; http://www.omg.org/news/meetings/workshops/proceedings.htm; pp. 1-3.
Meltzer, Ban et al.; "XML and Electronic Commerce: Enabling the Network Economy"; SIGMOD Record; ACM Press; vol. 27, No. 4; Dec. 1998; pp. 21-24.
Huhns. Michael N. et al.; "Automating Supply-Chain Mangement"; Jul. 15-19, 2002; pp. 1017-1074.
Soederstroem. Eva; "Standardising the Business Vocabulary of Standards"; SAC, Madrid, Spain; 2002; pp. 1048-1052.
Siegel, Jon; "OMG Overview: COBRA and the OMA in Enterprise Computing"; Communications of the ACM; vol. 41, No. 10; Oct. 1998; pp. 37-43.
Yang, Jian et al.; "Interoperation Support for Electronic Business"; Communications of the ACM; vol. 43, No. 6; Jun. 2000; pp. 39-47.
Levi, Keith et al.; "A Goal-Driven Approach to Enterprise Component Identification and Specification"; Communications of the ACM; vol. 45, No. 10; Oct. 2002; pp. 45-52.
Terai, Koichi et al.; "Coordinating Web Services Based on Business Models"; 2003; pp. 473-478.
Aversano, Lerina et al.; "Introducing eServices in Business Process Models"; SEKE '02; Ischia Italy; Jul. 15-19, 2002; pp. 481-488.
Quix, Christoph et al.; "Business Data Management for Business-to-Business Electronic Commerce"; SIGMOD Record; vol. 31, No. 1; Mar. 2002; pp. 49-54.
Sutherland, Jeff; "Why I Love the OMG: Emergence of a Business Object Component Architecture"; Standard View; vol. 6, No. 1; Mar. 1998; pp. 4-13.
Dogac, Asuman et al.; "An ebXML, Infrastructure Implementation through UDDI Registries and RosetaNet PIPs"; ACM SIGMOD; Madison, Wisconsin; Jun. 4-6, 2002; pp. 512-523.
Lee, Jinyoul et al.; "Enterprise Integration With ERP and EAI"; Communications of the ACM; vol. 46, No. 2; Feb. 2003; pp. 54-60.
Bratthall, Lars G. et al.; "Integrating Hundreds of Products through One Architecture —The Industrial IT Architecture"; ICSE '02; Orlando, Florida; May 19-25, 2002; pp. 604-614.
Fingar, Peter; "Component-Based Frameworks for E-Commerce"; Communications of the ACM; vol. 43, No. 10; Oct. 2000; pp. 61-66.
Sprott, David; "Componentizing the Enterprise Application Packages"; Communications of the ACM; vol. 43, No. 4; Apr. 2000; pp. 63-69.

Gokhale, Aniruddha et al.; "Applying Model-Integrated Computing to Component Middleware and Enterprise Applications"; Communications of the ACM; vol. 45, No. 10; Oct. 2002; pp. 65-70.
Bussler, Christoph; "The Role of B2B Engines in B2B Integration Architectures"; SIGMOD Record; vol. 31, No. 1; Mar. 2002; pp. 67-72.
Fremantle, Paul et al.; "Enterprise Services"; Communications of the ACM; vol. 45, No. 10; Oct. 2002; pp. 77-79.
Trastour, David et al.; "Semanctic Web Support for the Business-to-Business E-Commerce Lifecycle"; WWW2002, Honolulu, Hawaii; May 7-11, 2002; pp. 89-98.
Jaeger, Dirl et al.; "Using UML for Software Process Modeling"; pp. 91-108, 1999.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000l; pp. 95-96.
Stonebraker, Michael; "Too Much Middleware"; SIGMOD Record; vol. 31, No. 1; Mar. 2002; pp. 97-106.
Maamar, Zakaria et al.; "Toward Intelligent Business Objects"; Communications of the ACM; vol. 43. No. 10; Oct. 2000; pp. 99-101.
Tenenbaum, Jay M. et al.; "Eco System: An Internet Commerce Architecture"; IEEE; May 1997; pp. 48-55.

* cited by examiner

*Primary Examiner* — Ella Colbert
*Assistant Examiner* — Abdulmajeed Aziz
(74) *Attorney, Agent, or Firm* — Fish & Richardson P.C.

(57) ABSTRACT

Methods and systems consistent with the present invention provide a data processing system having a business object model reflecting the data used during a business transaction. Consistent interfaces are generated from the business object model. These interfaces are suitable for use across industries, across businesses, and across different departments within a business during a business transaction.

31 Claims, 846 Drawing Sheets

Fig. 25

| CCT | | Category | Obj. Class | Prop. Term | Rep. Term | Type | Type Name | Lgth. | Card. | Remarks |
|---|---|---|---|---|---|---|---|---|---|---|
| Amount 2500 | | Complex Type 2504 | | Amount 2510 | Content 2514 | xsd 2518 | decimal 2522 | 22.6 2526 | | |
| | Currency Code 2502 | Attribute 2506 | Amount 2508 | Currency 2512 | Code 2516 | xsd 2520 | token 2524 | 3 2528 | 1 2530 | Mandatory 2532 |

Fig. 26a

| CCT | | Category | Obj. Class | Prop. Term | Rep. Term | Type | Type Name | Card. | Remarks |
|---|---|---|---|---|---|---|---|---|---|
| Binary-Object 2600 | | complex Type 2612 | | Binary-Object 2634 | Content 2646 | xsd 2658 | base64 binary 2670 | | |
| | mime Code 2602 | Attribute 2614 | Binary-Object 2624 | Mime 2636 | Code 2648 | xsd 2660 | token 2672 | 0..1 2680 | Necessary when Binary Object is represented as an element value 2688 |
| | charSet Code 2604 | Attribute 2616 | Binary-Object 2626 | Character Set 2638 | Code 2650 | xsd 2662 | token 2674 | 0..1 2682 | Necessary when Binary Object is represented as an element value and comprises text data 2690 |
| | format 2606 | Attribute 2618 | Binary-Object 2628 | Format 2640 | Text 2652 | xsd 2664 | token 2675 | 0..1 2684 | Optional 2692 |

Fig. 26b

| CCT | | | Obj. Class | Prop. Term | Rep. Term | Type | Type Name | Card. | Remarks |
|---|---|---|---|---|---|---|---|---|---|
| | filename 2608 | Attribute 2620 | Binary-Object 2630 | Filename 2642 | Text 2654 | xsd 2666 | string 2676 | 0..1 2686 | Not defined in ebXML CCTS 1.8 (but is to be submitted); conforms with IETF RFC 1341 2694 |
| | URI 2610 | Attribute 2622 | Binary-Object 2632 | Uniform Resource 2644 | Identifier 2656 | xsd 2668 | anyURI 2678 | | Necessary when referencing a remote Binary Object 2696 |

Fig. 27

| CCT | | Category | Obj. Class | Prop. Term | Rep. Term | Type | Type Name | Card. | Remarks |
|---|---|---|---|---|---|---|---|---|---|
| Code 2700 | | complex Type 2712 | | Code 2734 | Content 2746 | xsd 2750 | token 2770 | | |
| | listID 2702 | Attribute 2714 | CodeList 2724 | Identification 2736 | Identifier 2748 | xsd 2760 | token 2772 | 0..1 2782 | Optional 2792 |
| | listVersion ID 2704 | Attribute 2716 | CodeList 2726 | Version 2738 | Identifier 2750 | xsd 2762 | token 2774 | 0..1 2784 | Optional 2794 |
| | listAgency ID 2706 | Attribute 2718 | CodeList Agency 2728 | Identification 2740 | Identifier 2752 | xsd 2764 | token 2776 | 0..1 2786 | Optional 2796 |
| | listAgency - SchemeID 2708 | Attribute 2720 | CodeList Agency 2730 | Scheme 2742 | Identifier 2754 | xsd 2766 | token 2778 | 0..1 2788 | Optional 2797 |
| | listAgency -Scheme AgencyID 2710 | Attribute 2722 | CodeList Agency 2732 | Scheme Agency 2744 | Identifier 2756 | xsd 2768 | token 2780 | 0..1 2790 | Optional 2798 |

Fig. 28

| CCT | Category | Prop. Term | Rep. Term | Type | Type Name |
|---|---|---|---|---|---|
| DateTime 2800 | simpleType 2802 | DateTime 2804 | Content 2806 | xsd 2808 | dateTime 2810 |

Fig. 29

| CCT | | Cat. | Obj. Class | Prop. Term | Rep. Term | Type | Type Name | Lgth. | Card. | Remarks |
|---|---|---|---|---|---|---|---|---|---|---|
| Electronic Address 2900 | | complex Type 2906 | | Electronic Address 2916 | Content 2922 | xsd 2930 | anyURI 2934 | | | |
| | protocol ID 2902 | Attribute 2908 | Electronic Address 2912 | Protocol 2918 | Identifier 2924 | xsd 2930 | token 2936 | | 0..1 2942 | Optional 2946 |
| | language Code 2904 | Attribute 2910 | Electronic Address 2914 | Language 2920 | Code 2926 | xsd 2932 | language 2938 | 2..9 2940 | 0..1 2944 | Optional 2948 |

Fig. 30a

| CCT | | Cat. | Obj. Class | Prop. Term | Rep. Term | Type | Data-type | Lgth. | Card. | Remarks |
|---|---|---|---|---|---|---|---|---|---|---|
| Identifier 3000 | | complex Type 3012 | Identifier 3024 | Identifier 3036 | Content 3048 | xsd 3060 | token 3072 | | | |
| | scheme ID 3002 | Attribute 3014 | Identification Scheme 3026 | Identification 3038 | Identifier 3050 | xsd 3062 | token 3074 | 1..60 3084 | 0..1 3090 | Optional 3095 |
| | scheme Version ID 3004 | Attribute 3016 | Identification Scheme 3028 | Version 3040 | Identifier 3052 | xsd 3064 | token 3076 | 1..15 3086 | 0..1 3091 | Optional 3096 |
| | scheme Agency ID 3006 | Attribute 3018 | Identification Scheme-Agency 3030 | Identification 3042 | Identifier 3054 | xsd 3066 | token 3078 | 1..60 3087 | 0..1 3092 | Optional 3097 |

Fig. 30b

| CCT | | Cat. | Obj. Class | Prop. Term | Rep. Term | Type | Data-type | Lgth. | Card. | Remarks |
|---|---|---|---|---|---|---|---|---|---|---|
| | scheme Agency-Scheme ID 3008 | Attribute 3020 | Identification Scheme-Agency 3032 | Scheme 3044 | Identifier 3056 | xsd 3068 | token 3080 | 1..60 3088 | 0..1 3093 | Optional 3098 |
| | scheme Agency-Scheme Agency ID 3010 | Attribute 3022 | Identification Scheme-Agency 3034 | Scheme Agency 3046 | Identifier 3058 | xsd 3070 | token 3082 | 3 3089 | 0..1 3094 | Optional 3099 |

Fig. 31

| CCT | | Cat. | Obj. Class | Type | Type Name |
|---|---|---|---|---|---|
| Indicator 3100 | Simple Type 3102 | Indicator 3104 | Content 3106 | xsd 3108 | Boolean 3110 |

Fig. 32

| CCT | | Cat. | Obj. Class | Prop. Term | Rep. Term | Data Type | Lgth. | Card. | Remarks |
|---|---|---|---|---|---|---|---|---|---|
| Measure 3200 | | Complex Type 3204 | | Measure 3210 | Content 3214 | xsd: decimal 3218 | 13.6 3222 | | |
| | Unit Code 3202 | Attribute 3206 | Quantity 3208 | Unit 3212 | Code 3216 | xsd: token 3220 | 1..3 3224 | 1 3226 | Mandatory 3228 |

Fig. 33

| CCT | Cat. | Prop. Term | Rep. Term | Data Type |
|---|---|---|---|---|
| Numeric 3300 | Complex Type 3302 | Numeric 3304 | Content 3306 | xsd: decimal 3308 |

Fig. 34

| CCT | | Cat. | Obj. Class | Prop. Term | Rep. Term | Data Type | Lgth. | Card. | Remarks |
|---|---|---|---|---|---|---|---|---|---|
| Quantity 3400 | | Complex Type 3404 | | Quantity 3410 | Content 3414 | xsd: decimal 3418 | 13.6 3422 | | |
| | Unit Code 3402 | Attribute 3406 | Quantity 3408 | Unit 3412 | Code 3416 | xsd: token 3420 | 1..3 3424 | 1 3426 | Mandatory 3428 |

Fig. 35

| CCT | | Cat. | Prop. Term | Rep. Term | Type | Type Name | Lgth. | Card. | Remarks |
|---|---|---|---|---|---|---|---|---|---|
| Text 3500 | | Complex Type 3504 | Text 3508 | Content 3512 | xsd 3516 | string 3520 | ∞ 3524 | | |
| | Language Code 3502 | Attribute 3506 | Language 3510 | Code 3514 | xsd 3518 | language 3522 | 2..9 3526 | 0..1 3528I | Optional 3530 |

Fig. 36

| GDT | Prop. | Rep./ Assn. | Type | Type Name | Lgth. | Remarks |
|---|---|---|---|---|---|---|
| Acceptance Status Code 3600 | Acceptance Status Code 3602 | Code 3604 | CCT 3606 | Code 3608 | 2 3610 | Restricted 3612 |

Fig. 37

| GDT | | Cat. | Obj. Class | Prop. | Rep./Assn | Type | Type Name | Lgth. | Card. |
|---|---|---|---|---|---|---|---|---|---|
| Accounting Object Set 3700 | | | Accounting Object Set 3706 | | Details 3712 | | | | |
| | Cost Center ID 3702 | Element 3704 | Cost Center 3708 | Identification 3710 | Identifier 3714 | CCT 3716 | Identifier 3718 | 1..32 3720 | 0..1 3722 |

Fig. 38

| GDT | Prop. | Rep./Assn | Type | Type Name | Lgth. | Remarks |
|---|---|---|---|---|---|---|
| Action Code 3802 | Action 3804 | Code 3806 | CCT 3808 | Code 3810 | 2 3812 | Restricted 3814 |

Fig. 39

| GDT | Prop. | Rep./ Assn. | Type |
|---|---|---|---|
| Active Indicator 3902 | Active Indicator 3904 | Indicator 3906 | CCT: Indicator 3908 |

Fig. 40a

| GDT | | | Cat. | Obj. Class | Prop. | Rep./ Assn. | Type | Type Name | Lgth. | Card. | Remarks |
|---|---|---|---|---|---|---|---|---|---|---|---|
| Address 4000a | | | | Address 4000b | | Details 4000c | | | | | |
| | Organisation Formatted Name 4002a | | E 4002b | Address 4002c | Organisation Formatted Name 4002d | Name 4002e | CCT 4002f | Text 4002g | ..40 4002h | 0..4 4002i | Restricted 4002j |
| | Person Name 4003a | | E 4003b | Address 4003c | Person Name 4003d | Person Name 4003e | GDT 4003f | Person Name 4003g | | 0..1 4003h | |
| | Functional Title Name 4004a | | E 4004b | Address 4004c | Functional Title Name 4004d | Name 4004e | CCT 4004f | Text 4004g | ..40 4004h | 0..1 4004i | Restricted 4004j |
| | Department Name 4005a | | E 4005b | Address 4005c | Department Name 4005d | Name 4005e | CCT 4005f | Text 4005g | ..40 4005h | 0..1 4005i | Restricted 4005j |
| | Office 4006a | | E 4006b | Address 4006c | Office 4006d | Details 4006e | | | | 0..1 4006f | |
| | | Building ID 4007a | E 4007b | Office 4007c | Building Identification 4007d | Identifier 4007e | CCT 4007f | Identifier 4007g | 1..10 4007h | 0..1 4007i | Restricted 4007j |

Fig. 40b

| | | Cat. | Obj. Class | Prop. | Rep./ Assn. | Type | Type Name | Lgth. | Card. | Remarks |
|---|---|---|---|---|---|---|---|---|---|---|
| | Floor ID 4008a | E 4008b | Office 4008c | Floor Identification 4008d | Identifier 4008e | CCT 4008f | Identifier 4008g | 1..10 4008h | 0..1 4008i | Restricted 4008j |
| | Room ID 4009a | E 4008b | Office 4008c | Room Identification 4008d | Identifier 4008e | CCT 4008f | Identifier 4008g | 1..10 4008h | 0..1 4008i | Restricted 4008j |
| | In-house Mail ID 4010a | E 4010b | Office 4010c | In-house Mail Identification 4010d | Identifier 4010d | CCT 4010e | Identifier 4010f | 1..10 4010g | 0..1 4010h | Restricted 4010i |
| | Correspon-dence Short Name 4011a | E 4011b | Office 4011c | Correspon-dence Short Name 4011d | Name 4011e | CCT 4011f | Text 4011f | ..10 4011g | 0..1 4011h | Restricted 4011i |
| Physical Address 4012a | | E 4012b | Address 4012c | Physical Address 4012d | Details 4012e | | | | 0..1 4012f | |
| | Country Code 4013a | E 4013b | Physical Address 4013c | Country Code 4013d | Code 4013e | GDT 4013f | Country Code 4013g | | 0..1 4013h | |
| | Region Code 4014a | E 4014b | Physical Address 4014c | Region Code 4014d | Code 4014e | GDT 4014f | Region Code 4014g | | 0..1 4014h | |

Fig. 40c

| | | Cat. | Obj. Class | Prop. | Rep./ Assn. | Type | Type Name | Lgth. | Card. | Remarks |
|---|---|---|---|---|---|---|---|---|---|---|
| | Street Postal Code 4015a | E 4014b | Physical Address 4015c | Street Zip Code 4015d | Code 4015e | CCT 4015f | Code 4015g | 1..10 4015h | 0..1 4015i | Restricted 4015j |
| | PO Box Postal Code 4016a | E 4016b | Physical Address 4016c | PO Box Zip Code 4016d | Code 4016e | CCT 4016f | Code 4016g | 1..10 4016h | 0..1 4016i | Restricted 4016j |

Fig. 40d

| | | Cat. | Obj. Class | Prop. | Rep./ Assn. | Type | Type Name | Lgth. | Card. | Remarks |
|---|---|---|---|---|---|---|---|---|---|---|
| | Company Postal Code 4017a | E 4017b | Physical Address 4017c | Company Zip Code 4017d | Code 4017e | CCT 4017f | Code 4017g | 1..10 4017h | 0..1 4017i | Restricted 4017j |
| | City Name 4018a | E 4018b | Physical Address 4018c | City Name 4018d | Name 4018e | CCT 4018f | Text 4018g | ..40 4018h | 0..1 4018i | Restricted 4018j |
| | Additional City Name 4019a | E 4019b | Physical Address 4019c | Additional City Name 4019d | Name 4019e | CCT 4019f | Text 4019g | ..40 4019h | 0..1 4019i | Restricted 4019j |
| | District Name 4020a | E 4020b | Physical Address 4020c | District Name 4020d | Name 4020e | CCT 4020f | Text 4020g | ..40 4020h | 0..1 4020i | Restricted 4020j |
| | PO Box ID 4021a | E 4021b | Physical Address 4021c | PO Box Identifica-tion 4021d | Identifier 4021e | CCT 4021f | Identifier 4021g | 1..10 4021h | 0..1 4021i | Restricted 4021j |
| | PO Box Indicator 4022a | E 4022b | Physical Address 4022c | PO Box Indicator 4022d | Indicator 4022e | CCT 4022f | Indicator 4022g | | 0..1 4022h | |

Fig. 40e

| | | Cat. | Obj. Class | Prop. | Rep./ Assn. | Type | Type Name | Lgth. | Card. | Remarks |
|---|---|---|---|---|---|---|---|---|---|---|
| | PO Box Country Code 4023a | E 4023b | Physical Address 4023c | PO Box Country Code 4023d | Code 4023e | GDT 4023f | Country Code 4023g | | 0..1 4023h | |
| | PO Box Region Code 4024a | E 4024b | Physical Address 4024c | PO Box Region Code 4024d | Code 4024e | GDT 4024f | Region Code 4024g | | 0..1 4024h | |
| | PO Box City Name 4025a | E 4025b | Physical Address 4025c | PO Box City Name 4025d | Name 4025e | CCT 4025f | Text 4025g | ..40 4025h | 0..1 4025i | Restricted 4025j |
| | Street Name 4026a | E 4026b | Physical Address 4026c | Street Name 4026d | Name 4026e | CCT 4026f | Text 4026g | ..60 4026h | 0..1 4026i | Restricted 4026j |
| | Street Prefix Name 4027a | E 4027b | Physical Address 4027c | Street Prefix Name 4027d | Name 4027e | CCT 4027f | Text 4027g | ..40 4027h | 0..2 4027i | Restricted 4027j |
| | Street Suffix Name 4028a | E 4028b | Physical Address 4028c | Street Suffix Name 4028d | Name 4028e | CCT 4028f | Text 4028g | ..40 4028h | 0..2 4028i | Restricted 4027j |

Fig. 40f

| | | Cat. | Obj. Class | Prop. | Rep./ Assn. | Type | Type Name | Lgth. | Card. | Remarks |
|---|---|---|---|---|---|---|---|---|---|---|
| | House ID 4029a | E 4029b | Physical Address 4029c | House Identification 4029d | Identifier 4029e | CCT 4029f | Identifier 4029g | 1..10 4029h | 0..1 4029i | Restricted 4029j |
| | Additional House ID 4030a | E 4030b | Physical Address 4030c | Additional House Identification 4030d | Identifier 4030e | CCT 4030f | Identifier 4030g | 1..10 4030h | 0..1 4030i | Restricted 4030j |
| | Building ID 4031a | E 4031b | Physical Address 4031c | Building Identification 4031d | Identifier 4031e | CCT 4031f | Identifier 4031g | 1..20 4031h | 0..1 4031i | Restricted 4031j |
| | Floor ID 4032a | E 4032b | Physical Address 4032c | Floor Identification 4032d | Identifier 4032e | CCT 4032f | Identifier 4032g | 1..10 4032h | 0..1 4032i | Restricted 4032j |
| | Room ID 4033a | E 4033b | Physical Address 4033c | Room Identification 4033d | Identifier 4033e | CCT 4033f | Identifier 4033g | 1..10 4033h | 0..1 4033i | Restricted 4033j |
| | Care Of Name 4034a | E 4034b | Physical Address 4034c | Care Of Name 4034d | Name 4034e | CCT 4034f | Text 4034g | ..40 4034h | 0..1 4034i | Restricted 4034j |

Fig. 40g

| | | Cat. | Obj. Class | Prop. | Rep./ Assn. | Type | Type Name | Lgth. | Card. | Remarks |
|---|---|---|---|---|---|---|---|---|---|---|
| | Description 4035a | E 4035b | Physical Address 4035c | Description 4035d | Text 4035e | GDT 4035f | Description 4035g | | 0.. un bounded 4035h | |
| Tax Jurisdiction Code 4036a | | E 4036b | Address 4036c | Tax Jurisdiction Code 4036d | Code 4036e | GDT 4036f | Tax-Juris- diction Code 4036g | | 0..1 4036h | |

Fig. 40h

| | | | Cat. | Obj. Class | Prop. | Rep./ Assn. | Type | Type Name | Card. |
|---|---|---|---|---|---|---|---|---|---|
| Time Zone Difference Value 4037a | | | E 4037b | Address 4037c | Time Zone Difference Value 4037d | Value 4037e | GDT 4037f | Time Zone Difference Value 4037g | 0..1 4037h |
| Geo Coor-dinates 4038a | | | E 4038b | Address 4038c | Geo Coordinates 4038d | Geo Coordinates 4038e | GDT 4038f | Geo Coordinates 4038g | 0..1 4038h |
| Communi-cation 4039a | | | E 4039b | Address 4039c | Communication 4039d | Details 4030e | | | 0..1 4039f |
| | Corres-pondence Language Code 4040a | | E 4040b | Commu-nication 4040c | Corres-pondence Language Code 4040d | Code 4040e | GDT 4040f | Language Code 4040g | 0..1 4040h |
| | Telephone 4041a | | E 4041b | Communi-cation 4041c | Telephone 4041d | Details 4041e | | | 0..un-bounded 4041f |
| | | Number 4042a | E 4042b | Telephone 4042c | Phone Number 4042d | Phone Number 4042e | GDT 4042f | Phone Number 4042g | 1 4042h |
| | | Number Default Indicator 4043a | E 4043b | Telephone 4043c | Number Default Indicator 4043d | Indicator 4043e | CCT 4043f | Indicator 4043g | 1 4043h |

Fig. 40i

| | | | Cat. | Obj. Class | Prop. | Rep./ Assn. | Type | Type Name | Card. |
|---|---|---|---|---|---|---|---|---|---|
| | | Number Description 4044a | E 4044b | Telephone 4044c | Number Description 4044d | Text 4044e | GDT 4044f | Description 4044g | 0.. un-bounded 4044h |
| | | Number Usage Denial Indicator 4045a | E 4045b | Telephone 4045c | Number Usage Denial Indicator 4045d | Indicator 4045e | CCT 4045f | Indicator 4045g | 1 4045h |
| | Mobile Phone 4046a | | E 4046b | Communi-cation 4046c | Mobile Phone 4046d | Details 4046e | | | 0.. un-bounded 4046f |
| | | Number 4047a | E 4047b | Mobile phone 4047c | Phone Number 4047d | Phone Number 4047e | GDT 4047f | Phone Number 4047g | 1 4047h |
| | | Number Default Indicator 4048a | E 4048b | Mobile phone 4048c | Number Default Indicator 4048d | Indicator 4048e | CCT 4048f | Indicator 4048g | 1 4048h |
| | | Number Description 4049a | E 4049b | Mobile phone 4049c | Number Description 4049d | Text 4049e | GDT 4049f | Description 4049g | 0.. un-bounded 4049h |

Fig. 40j

| | | | Cat. | Obj. Class | Prop. | Rep./ Assn. | Type | Type Name | Card. |
|---|---|---|---|---|---|---|---|---|---|
| | | Number Usage Denial Indicator 4050a | E 4050b | Mobile phone 4050c | Number Usage Denial Indicator 4050d | Indicator 4050e | CCT 4050f | Indicator 4050g | 1 4050h |
| | Facsimile 4051a | | E 4051b | Communi-cation 4051c | Facsimile 4051d | Details 4051e | | | 0.. un-bounded 4051f |
| | | Number 4052a | E 4052b | Facsimile 4052c | Phone Number 4052d | Phone Number 4052e | GDT 4052f | Phone Number 4052g | 1 4052h |

Fig. 40k

| | | Cat. | Obj. Class | Prop. | Rep./ Assn. | Type | Type Name | Card. | Re-marks |
|---|---|---|---|---|---|---|---|---|---|
| | Number Default Indicator 4053a | E 4053b | Facsimile 4053c | Number Default Indicator 4053d | Indicator 4053e | CCT 4053f | Indicator 4053g | 1 4053h | |
| | Number Description 4054a | E 4054b | Facsimile 4054c | Number Description 4054d | Text 4054e | GDT 4054f | Description 4054g | 0.. un-bounded 4054h | |
| | Number Usage Denial Indicator 4055a | E 4055b | Facsimile 4055c | Number Usage Denial Indicator 4055d | Indicator 4055e | CCT 4055f | Indicator 4055g | 1 4055h | |
| Email 4056a | | E 4056b | Communi-cation 4056c | Email 4056d | Details 4056e | | | 0.. un-bounded 4056f | |
| | Address 4057a | E 4057b | Email 4057c | Email Address 4057d | Email Address 4057e | GDT 4057f | Email Address 4057g | 1 4057g | |
| | Address Default Indicator 4058a | E 4058b | Email 4058c | Email Address Default-Indicator 4058d | Indicator 4058e | CCT 4058f | Indicator 4058g | 1 4058h | |
| | Address Description 4059a | E 4059b | Email 4059c | Email Address Description 4059d | Text 4059e | GDT 4059f | Description 4059g | 0.. un-bounded 4059h | |

Fig. 40I

| | | Cat. | Obj. Class | Prop. | Rep./ Assn. | Type | Type Name | Card. | Remarks |
|---|---|---|---|---|---|---|---|---|---|
| | Address Usage Denial Indicator 4060a | E 4060b | Email 4060c | Email Address Usage Denial Indicator 4060d | Indicator 4060e | CCT 4060f | Indicator 4060g | 1 4060g | |

Fig. 40m

| | | Cat. | Obj. Class | Prop. | Rep./ Assn. | Type | Type Name | Card. |
|---|---|---|---|---|---|---|---|---|
| Web 4061a | | E 4061b | Communication 4061c | Web 4061d | Details 4061e | | | 0.. un-bounded 4061f |
| | Address 4062a | E 4062b | Web 4062c | Web Address 4062d | Address 4062e | GDT 4062f | Web Address 4062g | 1 4062h |
| | Address Default Indicator 4063a | E 4063b | Web 4063c | Address Default Indicator 4063d | Indicator 4063e | CCT 4063f | Indicator 4063g | 1 4063h |
| | Address Description 4064a | E 4064b | Web 4064c | Address Description 4064d | Text 4064e | GDT 4064f | Description 4064g | 0.. un-bounded 4064h |

Fig. 41

| GDT | | Cat. | Obj. Class | Prop. | Rep./ Assn. | Type | Type Name | Lgth. | Card. | Remarks |
|---|---|---|---|---|---|---|---|---|---|---|
| Adjustment Reason Code 4100 | | | | Adjustment Reason 4114 | Code 4122 | CCT 4130 | Code 4138 | 0..35 4146 | | Restricted 4156 |
| | List ID 4102 | Attribute 4108 | | Identification 4116 | Identifier 4124 | xsd 4132 | token 4140 | 1..60 4148 | 0..1 4152 | |
| | List Version ID 4104 | Attribute 4110 | | Version 4118 | Identifier 4126 | xsd 4134 | token 4142 | 1..15 4150 | 0..1 4154 | |
| | List Agency ID 4106 | Attribute 4112 | | Identification 4120 | Identifier 4128 | xsd 4136 | token 4144 | 1..60 4152 | 0..1 4158 | |

Fig. 42

| GDT | Prop. | Rep./ Assn. | Type | Type Name |
|---|---|---|---|---|
| Allowed Indicator 4200 | Allowed 4202 | Indicator 4204 | CCT 4206 | Indicator 4208 |

Fig. 43

| GDT | Prop. | Rep./ Assn. | Type | Type Name |
|---|---|---|---|---|
| Amount 4300 | Amount 4302 | Amount 4304 | CCT 4306 | Amount 4308 |

Fig. 44

| GDT | Prop. | Rep./ Assn. | Type | Type Name |
|---|---|---|---|---|
| Amount Balance Indicator 4400 | Amount Balance 4402 | Indicator 4404 | CCT 4406 | Indicator 4408 |

Fig. 45

| GDT | Obj. Class | Prop. | Rep./ Assn. | Type | Type Name | Lgth. |
|---|---|---|---|---|---|---|
| Aspect ID 4500 | Aspect 4502 | Identification 4504 | Identifier 4506 | CCT 4508 | Identifier 4510 | 1..40 4512 |

Fig. 46

| CCT | | Cat. | Obj. Class | Prop. | Rep/ Assn. | Type | Type Name | Lgth. | Card. | Remarks |
|---|---|---|---|---|---|---|---|---|---|---|
| Attach -ment 4600 | | | | Attachment 4602 | Binary Object 4604 | xsd 4606 | normalized String 4608 | | | Title 4610 |
| | Id 4612 | A 4614 | Attachment 4616 | Identification 4618 | Identifier 4620 | xsd 4622 | string 4624 | 1..35 4626 | 1 4628 | Must be unique as used for references using the manifest 4630 |
| | Filename 4632 | A 4634 | Attachment 4636 | Filename 4638 | Text 4640 | xsd 4642 | String 4644 | ..70 4646 | 0..1 4648 | |

Fig. 47

| CDT | Obj. Class Qual. | Obj. Class | Prop. | Rep./ Assn. | Type | Type Name |
|---|---|---|---|---|---|---|
| Attachment Web Address 4700 | Attachment 4702 | Web Address 4704 | Address 4706 | Electronic Address 4708 | GDT 4710 | Web Address 4712 |

Fig. 48

| GDT | Cat. | Obj. Class | Prop. Term | Rep. Term | Type | Data Type | Lgth. |
|---|---|---|---|---|---|---|---|
| Batch ID 4800 | Complex Type 4802 | Batch 4804 | Identification 4806 | Identifier 4808 | CCT 4810 | Identifier 4812 | 1..10 4814 |
| | Attribute 4818 | Identification Scheme 4820 | Identification 4822 | Identifier 4824 | xsd 4826 | token 4828 | |
| | Attribute 4836 | Identification Scheme 4838 | Version 4840 | Identifier 4842 | xsd 4844 | token 4846 | |
| | Attribute 4854 | Identification Scheme Agency 4856 | Identification 4858 | Identifier 4860 | xsd 4862 | token 4864 | |
| | Attribute 4872 | Identification Scheme Agency 4874 | Scheme 4876 | Identifier 4878 | xsd 4880 | token 4882 | |
| | Attribute 4890 | Identification Scheme Agency 4892 | Scheme Agency 4894 | Identifier 4896 | xsd 4898 | token 4899 | |

Fig. 49

| GDT | Obj. Class | Prop. | Rep./ Assn. | Type | Type Name | Lgth. |
|---|---|---|---|---|---|---|
| Bidding Condition Code 4900 | Bidding 4902 | Condition 4904 | Code 4906 | CCT 4908 | Code 4910 | 2 4912 |

Fig. 50a

| GDT | | Cat. | Obj. Class | Prop. | Rep./ Assn. | Type | Type Name | Lgth. | Card. |
|---|---|---|---|---|---|---|---|---|---|
| Business Document Message Header 5000 | | | Business Document Message 5002 | Header 5004 | Details 5006 | GDT 5008 | | | |
| | ID 5010 | E 5012 | Business Document Message 5014 | Identification 5016 | Identifier 5018 | GDT 5020 | Business Document Message ID 5022 | 1..35 5024 | 1..1 5026 |
| | Refer-ence ID 5028 | E 5030 | Business Document Message 5032 | Reference Identification 5034 | Identifier 5036 | GDT 5038 | Business Document Message ID 5040 | 1..35 5042 | 0..1 5044 |

Fig. 50b

| GDT | | Cat. | Obj. Class | Prop. | Rep./ Assn. | Type | Type Name | Lgth. | Card. |
|---|---|---|---|---|---|---|---|---|---|
| | Creation Date Time 5046 | E 5048 | Business Document Message 5050 | Creation Date Time 5052 | Date Time 5054 | GDT 5056 | Date Time 5058 | | 1..1 5060 |
| | Sender Party 5062 | E 5064 | Business Document Message 5066 | Sender 5068 | Party 5070 | GDT 5072 | Business Document Message Header Party 5074 | | 0..1 5076 |
| | Recipient Party 5078 | E 5080 | Business Document Message 5082 | Recipient 5084 | Party 5086 | GDT 5088 | Business Document Message Header Party 5090 | | 0..n 5092 |

Fig. 51a

| GDT | | Cat. | Obj. Class | Prop. | Rep./ Assn. | Type | Type Name | Lgth. | Card. |
|---|---|---|---|---|---|---|---|---|---|
| Business Document Message Header Party 5100 | | | Business Document Message Header Party 5102 | Details 5104 | | | | | |
| | Internal ID 5106 | E 5108 | Business Document Message Header Party 5110 | Internal Identification 5112 | Identifier 5114 | GDT 5116 | Party Internal ID 5118 | | 0..1 5120 |
| | Standard ID 5122 | E 5124 | Business Document Message Header Party 5126 | Standard Identification 5128 | Identifier 5130 | GDT 5132 | Party Standard ID 5134 | | 0..n 5136 |

Fig. 51b

| GDT | | Cat. | Obj. Class | Prop. | Rep./ Assn. | Type | Type Name | Lgth. | Card. |
|---|---|---|---|---|---|---|---|---|---|
| | Contact Person 5138 | E 5140 | Business Document Message Header Party 5142 | Contact Person 5144 | Contact Person 5146 | GDT 5148 | Contact Person 5152 | | 0..1 5152 |

Fig. 52a

| GDT | | Cat. | Obj. Class | Prop. Term | Rep. Term | Type | Type Name | Lgth. | Card. |
|---|---|---|---|---|---|---|---|---|---|
| Business Document Message ID 5200 | | Complex Type 5202 | Business Document Message 5204 | Identification 5206 | Identifier 5208 | CCT 5210 | Identifier 5212 | 1..35 5214 | Restricted 5216 |
| | Scheme ID 5218 | Attribute 5220 | Identification Scheme 5222 | Identification 5224 | Identifier 5226 | xsd 5228 | token 5230 | 1..60 5232 | 0..1 5234 |

Fig. 52b

| GDT | | Cat. | Obj. Class | Prop. Term | Rep. Term | Type | Type Name | Lgth. | Card. |
|---|---|---|---|---|---|---|---|---|---|
| | Scheme Agency ID 5236 | Attribute 5238 | Identification Scheme Agency 5240 | Identification 5242 | Identifier 5244 | xsd 5246 | token 5248 | 1..60 5250 | 0..1 5252 |
| | Scheme Agency Scheme Agency ID 5254 | Attribute 5256 | Identification Scheme Agency 5258 | Scheme Agency 5260 | Identifier 5262 | xsd 5264 | token 5266 | 3 5268 | 0..1 5270 |

Fig. 53

| GDT | Obj. Class | Prop. | Rep./ Assn. | Type | Type Name |
|---|---|---|---|---|---|
| Business Transaction Blocked Indicator 5300 | Business Transaction 5302 | Blocked Indicator 5304 | Indicator 5306 | CCT 5308 | Indicator 5310 |

Fig. 54

| GDT | | Prop. | Rep./ Assn. | Type | Type Name |
| --- | --- | --- | --- | --- | --- |
| Completed Indicator 5400 | | Completed Indicator 5402 | Indicator 5404 | CCT 5406 | Indicator 5408 |

Fig. 55

| GDT | | Obj. Class | Prop. | Rep./ Assn. | Type Name | Lgth. | Remarks |
| --- | --- | --- | --- | --- | --- | --- | --- |
| Business Transaction-Document Group ID 5500 | Business Transaction Document 5502 | Group Identification 5504 | Identifier 5506 | CCT 5508 | Identifier 5510 | 1..10 5512 | Restricted 5514 |

Fig. 56a

| GDT | | Cat. | Obj. Class | Prop. | Rep./ Assn. | Type | Type Name | Lgth. | Card. | Remarks |
|---|---|---|---|---|---|---|---|---|---|---|
| Business Transaction Document ID 5600 | | | Business Transaction Document 5602 | Identifi-cation 5604 | Identifier 5606 | CCT 5608 | Identifier 5610 | 1..35 5612 | | Restricted 5614 |
| | Scheme ID 5616 | A 5618 | Identifi-cation Scheme 5620 | Identifi-cation 5622 | Identifier 5624 | xsd 5626 | token 5628 | 1..60 5630 | 0..1 5632 | |
| | Scheme Agency ID 5634 | A 5636 | Identifi-cation Scheme Agency 5638 | Identifi-cation 5640 | Identifier 5642 | xsd 5644 | token 5646 | 1..60 5648 | 0..1 5650 | |
| | Scheme Agency Scheme ID 5652 | A 5654 | Identifi-cation Scheme Agency 5656 | Scheme 5658 | Identifier 5660 | xsd 5662 | token 5664 | 1..60 5666 | 0..1 5668 | |

Fig. 56b

| GDT | | Cat. | Obj. Class | Prop. | Rep./ Assn. | Type | Type Name | Lgth. | Card. | Remarks |
|---|---|---|---|---|---|---|---|---|---|---|
| | Scheme Agency Scheme Agency ID 5670 | A 5672 | Identifi- cation Scheme Agency 5674 | Scheme Agency 5676 | Identifier 5678 | xsd 5680 | token 5682 | 3 5684 | 0..1 5686 | |

Fig. 57

| GDT | Obj. Class | Prop. | Rep./ Assn. | Type | Type Name | Lgth. | Remarks |
|---|---|---|---|---|---|---|---|
| Business Transaction Document Item Group ID 5700 | Business- Transaction Document Item 5702 | Group Identification 5704 | Identifier 5706 | CCT 5708 | Identifier 5710 | 3 5712 | Restricted 5714 |

Fig. 58

| CDT | Obj. Class Qual. | Obj. Class | Prop. | Rep./ Assn. | Type | Type Name | Lgth. | Remarks |
|---|---|---|---|---|---|---|---|---|
| Business Transaction Document Item Hierarchy Relationship Type Code 5800 | Business Transaction Document Item Hierarchy 5802 | Relationship 5804 | Type Code 5806 | Code 5808 | GDT 5810 | Relationship Type Code 5812 | 3 5814 | Restricted 5816 |

Fig. 59

| GDT | Obj. Class | Prop. | Rep./ Assn. | Type | Type Name | Lgth. | Remarks |
|---|---|---|---|---|---|---|---|
| Business Transaction Document Item ID 5900 | Business-Transaction Document Item 5902 | Identification 5904 | Identifier 5906 | CCT 5908 | Identifier 5910 | 1..10 5912 | Restricted 5914 |

Fig. 60

| GDT | Obj. Class | Prop. | Rep./ Assn. | Type | Type Name | Lgth. | Remarks |
|---|---|---|---|---|---|---|---|
| Business Transaction Document Item Schedule Line ID 6000 | Business Transaction Document Item Schedule Line 6002 | Identification 6004 | Identifier 6006 | CCT 6008 | Identifier 6010 | 1..4 6012 | Restricted 6014 |

Fig. 61

| GDT | Obj. Class | Prop. | Rep./ Assn. | Type | Type Name |
|---|---|---|---|---|---|
| Third Party Indicator 6100 | Business Transaction Document Item 6102 | Third Party Deal Indicator 6104 | Indicator 6106 | CCT 6108 | Indicator 6110 |

Fig. 62

| GDT | Obj. Class | Prop. | Rep./ Assn. | Type | Type Name | Lgth. | Remarks |
|---|---|---|---|---|---|---|---|
| Business Transaction Document Item Type Code 6200 | Business Transaction Document Item 6202 | Type 6204 | Code 6206 | CCT 6208 | Code 6210 | ..3 6212 | Restricted 6214 |

Fig. 63a

| CDT | | Cat. | Obj. Class | Prop. Qualifier | Prop. | Rep./ Assn. | Type | Type Name | Card. |
|---|---|---|---|---|---|---|---|---|---|
| Business Transaction -Document Location 6300 | | | Business Transaction Document Location 6302 | | | Details 6304 | | | |
| | Internal ID 6306 | E 6308 | Business Transaction Document Location 6310 | Internal 6312 | Identification 6314 | Identifier 6316 | CDT 6318 | Location Internal ID 6320 | 0..1 6322 |
| | Standard ID 6324 | E 6326 | Business Transaction Document Location 6328 | Standard 6330 | Identification 6332 | Identifier 6334 | CDT 6336 | Location Standard ID 6338 | 0..n 6340 |

Fig. 63b

| CDT | | Cat. | Obj. Class | Prop. Qualifier | Prop. | Rep./ Assn. | Type | Type Name | Card. |
|---|---|---|---|---|---|---|---|---|---|
| | Buyer ID 6342 | E 6344 | Business Transaction Document Location 6346 | Buyer 6348 | Identification 6350 | Identifier 6352 | CDT 6354 | Location Party ID 6356 | 0..1 6358 |
| | Seller ID 6360 | E 6364 | Business Transaction Document Location 6364 | Seller 6366 | Identification 6368 | Identifier 6370 | CDT 6372 | Location Party ID 6374 | 0..1 6376 |
| | Product Recipient ID 6378 | E 6380 | Business Transaction Document Location 6390 | Product Recipient 6392 | Identification 6394 | Identifier 6396 | CDT 6398 | Location Party ID 6399 | 0..1 6301A |
| | Vendor ID 6302A | E 6303A | Business Transaction Document Location 6304A | Vendor 6305A | Identification 6306A | Identifier 6307A | CDT 6308A | Location Party ID 6309A | 0..1 6310A |
| | Bill To ID 6311A | E 6312A | Business Transaction -Document Location 6313A | Bill To 6314A | Identification 6315A | Identifier 6316A | CDT 6317A | Location Party ID 6318A | 0..1 6319A |

Fig. 63c

| CDT | | Cat. | Obj. Class | Prop. Qualifier | Prop. | Rep./ Assn. | Type | Type Name | Card. |
|---|---|---|---|---|---|---|---|---|---|
| | Bill From ID 6320A | E 6321A | Business Transaction Document Location 6322A | Bill From 6323A | Identification 6324A | Identifier 6325A | CDT 6326A | Location Party ID 6327A | 0..1 6328A |
| | Bidder ID 6329A | E 6330A | Business Transaction Document Location 6331A | Bidder 6332A | Identification 6333A | Identifier 6334A | CDT 6335A | Location Party ID 6336A | 0..1 6337A |
| | Address 6338A | E 6339A | Business Transaction Document Location 6340A | | Address 6340A | Address 6341A | GDT 6342A | Address 6343A | 0..1 6344A |
| | Note 6345A | E 6346A | Business Transaction Document Location 6347A | | Note 6348A | Text 6349A | GDT 6350A | Note 6351A | 0..1 6352A |

Fig. 64a

| CDT | | Cat. | Obj. Class | Prop. Qualifier | Prop. | Rep./ Assn. | Type | Type Name | Card. |
|---|---|---|---|---|---|---|---|---|---|
| Business Transaction Document Party 6400 | | | Business Transaction Document Party 6402 | | | Details 6404 | | | |
| | Internal ID 6406 | E 6408 | Business Transaction Document Party 6410 | Internal 6412 | Identification 6414 | Identifier 6416 | CDT 6418 | Party Internal ID 6420 | 0..1 6422 |
| | Standard ID 6424 | E 6426 | Business Transaction Document Party 6428 | Standard 6430 | Identification 6432 | Identifier 6434 | CDT 6436 | Party Standard ID 6438 | 0..n 6440 |
| | Buyer ID 6442 | E 6444 | Business Transaction Document Party 6446 | Buyer 6448 | Identification 6450 | Identifier 6452 | CDT 6454 | Party Party ID 6456 | 0..1 6458 |

Fig. 64b

| CDT | | Cat. | Obj. Class | Prop. Qualifier | Prop. | Rep./ Assn. | Type | Type Name | Card. |
|---|---|---|---|---|---|---|---|---|---|
| | Seller ID 6460 | E 6462 | Business Transaction Document Party 6464 | Seller 6466 | Identification 6468 | Identifier 6470 | CDT 6472 | Party Party ID 6474 | 0..1 6476 |
| | Product Recipient ID 6478 | E 6480 | Business Transaction Document Party 6482 | Product Recipient 6484 | Identification 6486 | Identifier 6488 | CDT 6490 | Party Party ID 6492 | 0..1 6494 |
| | Vendor ID 6496 | E 6498 | Business Transaction Document Party 6499 | Vendor 6401A | Identification 6402A | Identifier 6403A | CDT 6404A | Party Party ID 6405A | 0..1 6406A |
| | Bill To ID 6407A | E 6408A | Business Transaction Document Party 6409A | Bill To 6410A | Identification 6411A | Identifier 6412A | CDT 6413A | Party Party ID 6414A | 0..1 6415A |
| | Bill From ID 6416A | E 6417A | Business Transaction Document Party 6418A | Bill From 6419A | Identification 6420A | Identifier 6421A | CDT 6422A | Party Party ID 6423A | 0..1 6424A |

Fig. 64c

| CDT | | Cat. | Obj. Class | Prop. Qualifier | Prop. | Rep./ Assn. | Type | Type Name | Card. |
|---|---|---|---|---|---|---|---|---|---|
| | Bidder ID 6425A | E 6426A | Business Transaction Document Party 6427A | Bidder 6428A | Identification 6429A | Identifier 6430A | CDT 6431A | Party Party ID 6432A | 0..1 6433A |
| | Address 6434A | E 6435A | Business Transaction Document Party 6436A | | Address 6437A | Address 6438A | AGDT 6440A | Address 6441A | 0..1 6442A |
| | Contact Person 6443A | E 6444A | Business Transaction Document Party 6445A | | Contact Person 6446A | Contact Person 6447A | CDT 6448A | Contact Person 6449A | 0..1 6450A |

Fig. 65

| GDT | Obj. Class | Prop. | Rep./ Assn. | Type | Type Name |
|---|---|---|---|---|---|
| Business Transaction Document-Pricing Indicator 6500 | Business Transaction Document 6502 | Pricing Indicator 6504 | Indicator 6506 | CCT 6508 | Indicator 6510 |

Fig. 66a

| CDT | | Cat. | Obj. Class | Prop. Qualifier | Prop. | Rep./ Assn. | Type | Type Name | Card. |
|---|---|---|---|---|---|---|---|---|---|
| Business Transaction Document Product 6600 | | | Business Transaction Document Product 6602 | | | Details 6604 | | | |
| | Internal ID 6606 | E 6608 | Business Transaction Document Product 6610 | Internal 6612 | Identification 6614 | Identifier 6616 | CDT 6618 | Product Internal ID 6620 | 0..1 6622 |
| | Standard ID 6624 | E 6626 | Business Transaction Document Product 6628 | Standard 6630 | Identification 6632 | Identifier 6634 | CDT 6636 | Product Standard ID 6638 | 0..n 6640 |
| | Buyer ID 6642 | E 6644 | Business Transaction Document Product 6646 | Buyer 6648 | Identification 6650 | Identifier 6652 | CDT 6654 | Product Party ID 6656 | 0..1 6658 |
| | Seller ID 6660 | E 6662 | Business Transaction Document Product 6664 | Seller 6666 | Identification 6668 | Identifier 6670 | CDT 6672 | Product Party ID 6674 | 0..1 6676 |

Fig. 66b

| CDT | | Cat. | Obj. Class | Prop. Qualifier | Prop. | Rep./ Assn. | Type | Type Name | Card. |
|---|---|---|---|---|---|---|---|---|---|
| | Product Recipient ID 6678 | E 6680 | Business Transaction Document Product 6682 | Product Recipient 6684 | Identification 6686 | Identifier 6688 | CDT 6690 | Product Party ID 6692 | 0..1 6694 |
| | Vendor ID 6696 | E 6698 | Business Transaction Document Product 6699 | Vendor 6601A | Identification 6602A | Identifier 6603A | CDT 6604A | Product Party ID 6605A | 0..1 6606A |
| | Manufacturer ID 6607A | E 6608A | Business Transaction Document Product 6609A | Manu-facturer 6610A | Identification 6611A | Identifier 6612A | CDT 6613A | Product Party ID 6614A | 0..1 6615A |
| | Bill To ID 6616A | E 6617A | Business Transaction Document Product 6618A | Bill To 6619A | Identification 6620A | Identifier 6621A | CDT 6622A | Product Party ID 6623A | 0..1 6624A |
| | Bill From ID 6625A | E 6626A | Business Transaction Document Product 6627A | Bill From 6628A | Identification 6629A | Identifier 6630A | CDT 6631A | Product Party ID 6632A | 0..1 6633A |

Fig. 66c

| CDT | | Cat. | Obj. Class | Prop. Qualifier | Prop. | Rep./ Assn. | Type | Type Name | Card. |
|---|---|---|---|---|---|---|---|---|---|
| | Bidder ID 6634A | E 6635A | Business Transaction Document Product 6636A | Bidder 6637A | Identification 6638A | Identifier 6639A | CDT 6640A | Product Party ID 6641A | 0..1 6642A |
| | Type Code 6643A | E 6644A | Business Transaction Document Product 6645A | | Type Code 6646A | Code 6647A | GDT 6648A | Product Type Code 6649A | 0..1 6650A |
| | Note 6651A | E 6652A | Business Transaction Document Product 6653A | | Note 6654A | Note 6655A | GDT 6656A | Note 6657A | 0..1 6658A |
| Flat include of movement data | Change ID 6659A | E 6660A | Business Transaction Document Product 6661A | | Change Identification 6662A | Identifier 6663A | GDT 6664A | Product Change ID 6667A | 0..1 6666A |
| | Discontinuation Indicator 6666A | E 6667A | Business Transaction Document Product 6668A | | Discontinuation 6669A | Indicator 6670A | GDT 6671A | Product Discon-tinuation Indicator 6672A | 0..1 6673A |

Fig. 66d

| CDT | | Cat. | Obj. Class | Prop. Qualifier | Prop. | Rep./ Assn. | Type | Type Name | Card. |
|---|---|---|---|---|---|---|---|---|---|
| | Package Quantity 6674A | E 6675A | Business Transaction Document Product 6676A | Package 6677A | Quantity 6678A | Quantity 6679A | GDT 6680A | Quantity 6681A | 0..1 6682A |

Fig. 67a

| CDT | | Cat. | Obj. Class | Prop. Qualifier | Prop. | Rep./ Assn. | Type | Type Name | Card. |
|---|---|---|---|---|---|---|---|---|---|
| Business Transaction Document Product Cat. 6700 | | | Business Transaction Document Product Cat. 6702 | | | Details 6704 | | | |
| | Internal ID 6706 | E 6708 | Business Transaction Document Product Cat. 6710 | Internal 6712 | Identification 6714 | Identifier 6716 | CDT 6718 | Product Cat. Internal ID 6720 | 0..1 6722 |
| | Standard ID 6724 | E 6726 | Business Transaction Document Product Cat. 6728 | Standard 6730 | Identification 6732 | Identifier 6734 | CDT 6736 | Product Cat. Standard ID 6738 | 0..n 6740 |

Fig. 67b

| CDT | | Cat. | Obj. Class | Prop. Qualifier | Prop. | Rep./ Assn. | Type | Type Name | Card. |
|---|---|---|---|---|---|---|---|---|---|
| | Buyer ID 6742 | E 6744 | Business Transaction Document Product Cat. 6746 | Buyer 6748 | Identification 6750 | Identifier 6752 | CDT 6754 | Product Cat. Party ID 6756 | 0..1 6758 |
| | Seller ID 6760 | E 6762 | Business Transaction Document Product Cat. 6764 | Seller 6768 | Identification 6768 | Identifier 6770 | CDT 6772 | Product Cat. Party ID 6774 | 0..1 6776 |
| | Product Recipient ID 6778 | E 6780 | Business Transaction Document Product 6782 | Product Recipient 6784 | Identification 6786 | Identifier 6788 | CDT 6790 | Product Cat. Party ID 6792 | 0..1 6794 |
| | Vendor ID 6796 | E 6798 | Business Transaction Document Product 6799 | Vendor 6701A | Identification 6702A | Identifier 6703A | CDT 6704A | Product Cat. Party ID 6705A | 0..1 6706A |
| | Bill To ID 6707A | E 6708A | Business Transaction Document Product 6709A | Bill To 6710A | Identification 6711A | Identifier 6712A | CDT 6713A | Product Cat. Party ID 6714A | 0..1 6715A |

Fig. 67c

| CDT | | Cat. | Obj. Class | Prop. Qualifier | Prop. | Rep./ Assn. | Type | Type Name | Card. |
|---|---|---|---|---|---|---|---|---|---|
| | Bill From ID 6716A | E 6717A | Business Transaction Document Product 6718A | Bill From 6719A | Identification 6720A | Identifier 6721A | CDT 6722A | Product Cat.-Party ID 6723A | 0..1 6724A |
| | Bidder ID 6725A | E 6726A | Business Transaction Document Product 6727A | Bidder From 6728A | Identification 6729A | Identifier 6730A | CDT 6731A | Product Cat.-Party ID 6732A | 0..1 6733A |

Fig. 68

| GDT | Cat. | Obj. Class | Prop. | Rep./ Assn. | Type | Type Name |
|---|---|---|---|---|---|---|
| Business Transaction Document Public Indicator 6800 | | Business Transaction Document 6802 | Public Indicator 6804 | Indicator 6806 | CCT 6808 | Indicator 6810 |

Fig. 69

| GDT | | Cat. | Obj. Class | Prop. | Rep./ Assn. | Type | Type Name | Card. |
|---|---|---|---|---|---|---|---|---|
| Business Transaction Document-Reference 6900 | | | Business Transaction Document Reference 6902 | | Details 6904 | | | |
| | ID 6906 | E 6908 | Business Transaction Document Reference 6910 | Identification 6912 | Identifier 6914 | GDT 6916 | Business Transaction Document ID 6918 | 0..1 6920 |
| | Item ID 6922 | E 6924 | Business Transaction Document Reference 6926 | Item Identification 6928 | Identifier 6930 | GDT 6932 | Business Transaction Document-Item ID 6934 | 0..n 6936 |

Fig. 70

| GDT | Obj. Class | Prop. | Rep./ Assn. | Type | Type Name |
|---|---|---|---|---|---|
| Business Transaction Document Settlement Relevance Indicator 7000 | Business Transaction Document 7002 | Settlement Relevance Indicator 7004 | Indicator 7006 | CCT 7008 | Indicator 7010 |

Fig. 71a

| CDT | | Cat. | Obj. Class | Prop. Qualifier | Prop. | Rep/ Assn. | Type | Type Name | Ca rd. |
|---|---|---|---|---|---|---|---|---|---|
| Business Transaction -Document Ship From Location 7100 | | | Business Transaction -Document Ship From Location 7102 | | | Details 7104 | | | |
| | Internal ID 7106 | E 7108 | Business Transaction Document Ship From Location 7110 | Internal 7112 | Identifica-tion 7114 | Identifier 7116 | CDT 7118 | Location Internal ID 7120 | 0..1 7122 |
| | Standard ID 7124 | E 7126 | Business Transaction -Document Ship From Location 7128 | Standard 7130 | Identificatio n 7132 | Identifier 7134 | CDT 7136 | Location Standard ID 7138 | 0..n 7140 |

Fig. 71b

| CDT | | Cat. | Obj. Class | Prop. Qualifier | Prop. | Rep/ Assn. | Type | Type Name | Ca rd. |
|---|---|---|---|---|---|---|---|---|---|
| | Buyer ID 7142 | E 7144 | Business Transaction Document Ship From Location 7146 | Buyer 7148 | Identification 7150 | Identifier 7152 | CDT 7154 | Location Party ID 7156 | 0..1 7158 |
| | Seller ID 7160 | E 7162 | Business Transaction Document Ship From Location 7164 | Seller 7166 | Identification 7168 | Identifier 7172 | CDT 7172 | Location Party ID 7174 | 0..1 7176 |
| | Product Recipient ID 7178 | E 7180 | Business Transaction Document Ship From Location 7182 | Product Recipient 7184 | Identification 7186 | Identifier 7188 | CDT 7190 | Location Party ID 7192 | 0..1 7194 |

Fig. 71c

| CDT | | Cat. | Obj. Class | Prop. Qualifier | Prop. | Rep/ Assn. | Type | Type Name | Ca rd. |
|---|---|---|---|---|---|---|---|---|---|
| | Vendor ID 7196 | E 7198 | Business Transaction Document Ship From Location 7199 | Vendor 7101A | Identifica- tion 7102A | Identifier 7103A | CDT 7104A | Location Party ID 7105A | 0..1 7106A |
| | Address 7107A | E 7108A | Business Transaction Document Ship From Location 7109A | | Address 7110A | Address 7111A | GDT 7112A | Address 7113A | 0..1 7114A |
| | Note 7115A | E 7116A | Business Transaction Document Ship From Location 7117A | | Note 7118A | Text 7119A | GDT 7120A | Note 7121A | 0..1 7122A |

Fig. 71d

| CDT | | Cat. | Obj. Class | Prop. Qualifier | Prop. | Rep/ Assn. | Type | Type Name | Card. |
|---|---|---|---|---|---|---|---|---|---|
| | Loading Location 7123A | E 7124A | Business Transaction Document Ship From Location 7125A | | Loading Location 7126A | Business Transaction-Document Location 7127A | GDT 7128A | Business Transaction Document Location 7129A | 0..1 7130A |

Fig. 72a

| CDT | | Cat. | Obj. Class | Prop. Qualifier | Prop. | Rep./ Assn. | Type | Type Name | Card. |
|---|---|---|---|---|---|---|---|---|---|
| Business Transaction Document Ship To Location 7200 | | | Business Transaction Document Ship To Location 7202 | | | Details 7204 | | | |

Fig. 72b

| CDT | | Cat. | Obj. Class | Prop. Qualifier | Prop. | Rep./ Assn. | Type | Type Name | Card. |
|---|---|---|---|---|---|---|---|---|---|
| | Internal ID 7206 | E 7208 | Business Transaction Document Ship To Location 7210 | Internal 7212 | Identification 7214 | Identifier 7216 | CDT 7218 | Location Internal ID 7220 | 0..1 7222 |
| | Standard ID 7224 | E 7226 | Business Transaction Document Ship To Location 7228 | Standard 7230 | Identification 7232 | Identifier 7234 | CDT 7236 | Location Standard ID 7238 | 0..n 7240 |
| | Buyer ID 7242 | E 7244 | Business Transaction Document Ship To Location 7246 | Buyer 7248 | Identification 7250 | Identifier 7252 | CDT 7254 | Location Party ID 7256 | 0..1 7258 |

Fig. 72c

| CDT | | Cat. | Obj. Class | Prop. Qual. | Prop. | Rep./ Assn. | Type | Type Name | Card. |
|---|---|---|---|---|---|---|---|---|---|
| | Seller ID 7260 | E 7262 | Business TransactionDocument Ship To Location 7264 | Seller 7266 | Identification 7268 | Identifier 7270 | CDT 7272 | Location Party ID 7274 | 0..1 7276 |
| | Product Recipient ID 7278 | E 7280 | Business TransactionDocument Ship To Location 7282 | Product Recipient 7284 | Identification 7286 | Identifier 7288 | CDT 7290 | Location Party ID 7292 | 0..1 7294 |
| | Vendor ID 7296 | E 7298 | Business Transaction Document Ship To Location 7299 | Vendor 7201A | Identification 7201A | Identifier 7202A | CDT 7203A | Location Party ID 7204A | 0..1 7205A |

Fig. 72d

| CDT | | Cat. | Obj. Class | Prop. Qual. | Prop. | Rep./ Assn. | Type | Type Name | Card. |
|---|---|---|---|---|---|---|---|---|---|
| | Address 7206A | E 7207A | Business Transaction Document Ship To Location 7208A | | Address 7209A | Address 7210A | GDT 7211A | Address 7212A | 0..1 7213A |
| | Note 7214A | E 7215A | Business Transaction Document Ship To Location 7216A | | Note 7217A | Text 7218A | GDT 7219A | Note 7220A | 0..1 7221A |
| | Unloading Location 7222A | E 7223A | Business Transaction Document Ship To Location 7224A | | Unloading Location 7224A | Business Transaction Document Location 7226A | GDT 7227A | Business Transaction Document Location 7228A | 0..1 7229A |

Fig. 73a

| CDT | | Cat. | Obj. Class | Prop. Qual. | Prop. | Rep./ Assn. | Type | Type Name | Card. |
|---|---|---|---|---|---|---|---|---|---|
| Business Transaction Document Trans-shipment Location 7300 | | | Business Transaction Document Trans-shipment Location 7302 | | | Details 7304 | | | |
| | Internal ID 7306 | E 7308 | Business Transaction Document Trans-shipment Location 7310 | Internal 7312 | Identification 7314 | Identifier 7316 | CDT 7318 | Location Internal ID 7320 | 0..1 7322 |
| | Standard ID 7324 | E 7326 | Business Transaction Document Trans-shipment Location 7328 | Standard 7328 | Identification 7330 | Identifier 7332 | CDT 7334 | Location Standard ID 7336 | 0..n 7338 |

Fig. 73b

| CDT | | Cat. | Obj. Class | Prop. Qual. | Prop. | Rep./ Assn. | Type | Type Name | Card. |
|---|---|---|---|---|---|---|---|---|---|
| | Buyer ID 7340 | E 7342 | Business Transaction Document Trans-shipment Location 7344 | Buyer 7346 | Identification 7348 | Identifier 7350 | CDT 7352 | Location Party ID 7354 | 0..1 7356 |
| | Seller ID 7358 | E 7360 | Business Transaction Document Trans-shipment Location 7362 | Seller 7364 | Identification 7366 | Identifier 7368 | CDT 7370 | Location Party ID 7374 | 0..1 7374 |
| | Product Recipient 7376 | E 7378 | Business Transaction Document Trans-shipment Location 7380 | Product Recipient 7382 | Identification 7384 | Identifier 7386 | CDT 7388 | Location Party ID 7390 | 0..1 7392 |

Fig. 73c

| CDT | | Cat. | Obj. Class | Prop. Qual. | Prop. | Rep./ Assn. | Type | Type Name | Card. |
|---|---|---|---|---|---|---|---|---|---|
| | Vendor ID 7394 | E 7396 | Business Transaction Document Trans-shipment Location 7398 | Vendor 7399 | Identification 7301A | Identifier 7302A | CDT 7303A | Location Party ID 7304A | 0..1 7305A |
| | Address 7306A | E 7307A | Business Transaction Document Trans-shipment Location 7308A | | Address 7309A | Address 7310A | GDT 7311A | Address 7312A | 0..1 7313A |
| | Note 7314A | E 7315A | Business Transaction Document Trans-shipment Location 7316A | | Note 7317A | Text 7318A | GDT 7319A | Note 7320A | 0..1 7321A |

Fig. 73d

| CDT | | Cat. | Obj. Class | Prop. Qual. | Prop. | Rep./ Assn. | Type | Type Name | Card. |
|---|---|---|---|---|---|---|---|---|---|
| | Loading Location 7322A | E 7323A | Business Transaction Document Trans-shipment Location 7324A | | Loading Location 7325A | Business Transaction-Document Location 7326A | GDT 7327A | Business TransactionDocument Location 7328A | 0..1 7329A |
| | Unloading Location 7330A | E 7331A | Business Transaction Document Trans-shipment Location 7332A | | Unloading Location 7333A | Business Transaction-Document Location 7334A | GDT 7335A | Business TransactionDocument Location 7336A | 0..1 7337A |

Fig. 74

| GDT | Obj. Class | Prop. | Rep./ Assn. | Type | Type Name | Lgth. | Remarks |
|---|---|---|---|---|---|---|---|
| Business Transaction Document Type Code 7400 | Business Transaction Document 7402 | Type 7404 | Code 7406 | CCT 7408 | Code 7410 | ..3 7412 | Restricted 7414 |

Fig. 75

| GDT | Obj. Class | Prop. | Rep./ Assn. | Type | Type Name | Lgth. | Remarks |
|---|---|---|---|---|---|---|---|
| Business Transaction Execution Status Code 7500 | Business Transaction 7502 | Execution Status Code 7504 | Code 7506 | CCT 7508 | Code 7510 | 1 7512 | Restricted 7514 |

Fig. 76

| GDT | Obj. Class | Prop. | Rep./ Assn. | Type | Type Name | Lgth. | Remarks |
|---|---|---|---|---|---|---|---|
| Business Transaction Priority Code 7600 | Business Transaction 7602 | Priority Code 7604 | Code 7606 | CCT 7608 | Code 7608 | 1 7610 | Restricted 7612 |

Fig. 77

| GDT | Obj. Class | Prop. | Rep./ Assn. | Type | Type Name | Lgth. | Remarks |
|---|---|---|---|---|---|---|---|
| Business Transaction Type Code 7700 | Business Transaction 7702 | Type Code 7704 | Code 7706 | CCT 7708 | Code 7710 | 4 7712 | Restricted 7714 |

Fig. 78

| GTD | | Cat. | Obj. Class | Prop. | Rep./ Assn. | Type | Type Name | Lgth. | Card. |
|---|---|---|---|---|---|---|---|---|---|
| Cash Discount 7800 | | | Cash Discount 7802 | | Details 7804 | | | | |
| | Days Value 7806 | E 7808 | Cash Discount 7810 | Days 7812 | Value 7814 | GDT 7816 | Integer Value 7818 | 1..3 7820 | 1 7822 |
| | Percent 7824 | E 7826 | Cash Discount 7828 | Percent 7830 | Percent 7832 | GDT 7834 | Percent 7836 | Max. 5/3 7838 | 1 7840 |

Fig. 79

| GDT | | Cat. | Obj. Class | Prop. | Rep./ Assn. | Type | Data Type | Lgth. | Card. |
|---|---|---|---|---|---|---|---|---|---|
| Cash Discount Terms 7900 | | | Cash Discount Terms 7902 | | Details 7904 | | | | |
| | Payment Baseline Date 7906 | E 7908 | Cash Discount Terms 7910 | Payment Baseline Date 7912 | Date 7914 | GDT 7916 | Date 7918 | | 0..1 7920 |
| | Maximum Cash Discount 7922 | E 7924 | Cash Discount Terms 7926 | Maximum Cash Discount 7928 | Details 7930 | GDT 7932 | Cash Discount 7934 | | 0..1 7936 |
| | Normal Cash Discount 7938 | E 7940 | Cash Discount Terms 7942 | Normal Cash Discount 7944 | Details 7946 | GDT 7948 | Cash Discount 7950 | | 0..1 7952 |
| | Full Payment Due Days Value 7954 | E 7956 | Cash Discount Terms 7960 | Full Payment Due Days 7962 | Value 7964 | GDT 7966 | Integer Value 7968 | 1..3 7970 | 0..1 7972 |

Fig. 80a

| GDT | | Cat. | Obj. Class | Prop. | Rep./ Assn. | Type | Type Name | Lgth. | Card. | Remarks |
|---|---|---|---|---|---|---|---|---|---|---|
| Catalogue ID 8000 | | | Catalog 8002 | Identification 8004 | Identifier 8006 | CCT 8008 | Identifier 8010 | 1..40 8012 | | Restricted 8014 |
| | Scheme ID 8016 | A 8018 | Identification Scheme 8020 | Identification 8022 | Identifier 8024 | xsd 8026 | token 8028 | 1..60 8030 | 0..1 8032 | |
| | Scheme Agency ID 8034 | A 8036 | Identification Scheme Agency 8038 | Identification 8040 | Identifier 8042 | xsd 8044 | token 8046 | 1..60 8048 | 0..1 8050 | |
| | Scheme Agency Scheme ID 8052 | A 8054 | Identification Scheme Agency 8056 | Scheme 8058 | Identifier 8060 | xsd 8062 | token 8064 | 1..60 8066 | 0..1 8068 | |

Fig. 80b

| GDT | | Cat. | Obj. Class | Prop. | Rep./ Assn. | Type | Type Name | Lgth. | Card. | Remarks |
|---|---|---|---|---|---|---|---|---|---|---|
| | Scheme Agency Scheme Agency ID 8070 | A 8072 | Identification Scheme Agency 8074 | Scheme Agency 8076 | Identifier 8078 | xsd 8080 | token 8082 | 3 8084 | 0..1 8086 | |

Fig. 81

| GDT | Obj. Class | Prop. | Rep./ Assn. | Type | Type Name | Lgth. | Remarks |
|---|---|---|---|---|---|---|---|
| Catalogue Item ID 8100 | Catalogue Item 8102 | Identification 8104 | Identifier 8106 | CCT 8108 | Identifier 8110 | 1..40 8112 | Restricted 8114 |

Fig. 82

| GDT | | Cat. | Obj. Class | Prop. | Rep./ Assn. | Type | Type Name | Card. |
|---|---|---|---|---|---|---|---|---|
| Catalogue Reference 8200 | | | Catalogue Reference 8202 | | Details 8204 | | | |
| | ID 8206 | E 8208 | Catalogue Reference 8210 | Identification 8212 | Identifier 8214 | GDT 8216 | Catalogue ID 8218 | 1 8220 |
| | Item ID 8222 | E 8224 | Catalogue Reference 8226 | Item Identification 8228 | Identifier 8230 | GDT 8232 | Catalogue Item ID 8234 | 0..n 8236 |

Fig. 83

| GDT | Obj. Class | Prop. | Rep./ Assn. | Type | Type Name | Lgth. | Remarks |
|---|---|---|---|---|---|---|---|
| Catalogue Schema ID 8300 | Catalogue Schema 8302 | Identification 8304 | Identifier 8306 | CCT 8308 | Identifier 8310 | 1..40 8312 | Restricted 8314 |

Fig. 84

| GDT | Obj. Class | Prop. | Rep./ Assn. | Type | Type Name | Lgth. | Remarks |
|---|---|---|---|---|---|---|---|
| Catalogue Schema Type Code 8400 | Catalogue Schema 8402 | Type 8404 | Code 8406 | CCT 8408 | Code 8410 | 2 8412 | Restricted 8414 |

Fig. 85

| GDT | Obj. Class | Prop. | Rep./ Assn. | Type | Type Name | Lgth. | Remarks |
|---|---|---|---|---|---|---|---|
| Catalogue Section ID 8500 | Catalogue Section 8502 | Identification 8504 | Identifier 8506 | CCT 8508 | Identifier 8510 | 1..40 8512 | Restricted 8514 |

Fig. 86

| GDT | Obj. Class | Prop. | Rep./ Assn. | Type | Type Name | Lgth. | Remarks |
|---|---|---|---|---|---|---|---|
| Catalogue Section Type ID 8600 | Catalogue Section Type 8602 | Identification 8604 | Identifier 8606 | CCT 8608 | Identifier 8610 | 1..40 8612 | Restricted 8614 |

Fig. 87

| GDT | Obj. Class | Prop. | Rep./ Assn. | Type | Type Name | Lgth. | Remarks |
|---|---|---|---|---|---|---|---|
| Catalogue Type Code 8700 | Catalog 8702 | Type 8704 | Code 8706 | CCT 8708 | Code 8710 | 2 8712 | Restricted 8714 |

Fig. 88

| GDT | Obj. Class | Prop. | Rep./ Assn. | Type | Type Name | Lgth. | Remarks |
|---|---|---|---|---|---|---|---|
| Catalogue View ID 8800 | Catalogue View 8802 | Identification 8804 | Identifier 8806 | CCT 8808 | Identifier 8810 | 1..40 8812 | Restricted 8814 |

Fig. 89

| GDT | Obj. Class | Prop. | Rep./ Assn. | Type | Type Name |
|---|---|---|---|---|---|
| Complete Transmission Indicator 8900 | Complete Transmission 8902 | Indicator 8904 | Indicator 8906 | CCT 8908 | Indicator 8910 |

Fig. 90

| GDT | Prop. Term | Rep./ Assn. | Type | Type Name |
|---|---|---|---|---|
| Consignment Indicator 9000 | Consignment Indicator 9002 | Indicator 9004 | CCT 9006 | Indicator 9008 |

Fig. 91a

| CDT | | Cat. | Obj. Class | Prop. Qual. | Prop. | Rep./ Assn. | Type | Type Name | Card. |
|---|---|---|---|---|---|---|---|---|---|
| Contact Person 9100 | | | Contact Person 9102 | | | Details 9104 | | | |
| | Internal ID 9106 | E 9108 | Contact Person 9110 | Internal 9112 | Identification 9114 | Identifier 9116 | CDT 9118 | Contact Person Internal ID 9120 | 0..1 9122 |
| | Buyer ID 9124 | E 9126 | Contact Person 9128 | Buyer 9130 | Identification 9132 | Identifier 9134 | CDT 9136 | Contact Person Party ID 9138 | 0..1 9140 |
| | Seller ID 9142 | E 9144 | Contact Person 9146 | Seller 9148 | Identification 9150 | Identifier 9152 | CDT 9154 | Contact Person Party ID 9156 | 0..1 9158 |
| | Product Recipient ID 9160 | E 9162 | Contact Person 9164 | Product Recipient 9166 | Identification 9168 | Identifier 9170 | CDT 9172 | Contact Person Party ID 9174 | 0..1 9176 |

Fig. 91b

| CDT | | Cat. | Obj. Class | Prop. Qual. | Prop. | Rep./ Assn. | Type | Type Name | Card. |
|---|---|---|---|---|---|---|---|---|---|
| | Vendor ID 9178 | E 9180 | Contact Person 9182 | Vendor 9184 | Identification 9186 | Identifier 9188 | CDT 9190 | Contact Person Party ID 9192 | 0..1 9194 |
| | Bill To ID 9196 | E 9198 | Contact Person 9199 | Bill To 9101A | Identification 9102A | Identifier 9103A | CDT 9104A | Contact Person Party ID 9105A | 0..1 9106A |
| | Bill From ID 9107A | E 9108A | Contact Person 9109A | Bill From 9110A | Identification 9111A | Identifier 9112A | CDT 9113A | Contact Person Party ID 9114A | 0..1 9115A |
| | Bidder ID 9116A | E 9117A | Contact Person 9118A | Bidder 9119A | Identification 9120A | Identifier 9121A | CDT 9122A | Contact Person Party ID 9123A | 0..1 9124A |
| | Address 9125A | E 9126A | Contact Person 9127A | | Address 9128A | Address 9129A | AGDT 9130A | Address 9131A | 0..1 9132A |

Fig. 92

| GDT | | Cat. | Obj. Class | Prop. | Rep./ Assn. | Type | Type Name | Lgth. | Card. | Remarks |
|---|---|---|---|---|---|---|---|---|---|---|
| Contact Person ID 9200 | | | Contact Person 9202 | Identification 9204 | Identifier 9206 | CCT 9208 | Identifier 9210 | 1..60 9212 | | Restricted 9214 |
| | scheme ID 9216 | A 9218 | Identification Scheme 9220 | Identification 9222 | Identifier 9224 | xsd 9226 | token 9228 | 1..60 9230 | 0..1 9232 | |
| | scheme Agency ID 9234 | A 9236 | Identification Scheme Agency 9238 | Identification 9240 | Identifier 9242 | xsd 9244 | token 9246 | 1..60 9248 | 0..1 9250 | |
| | scheme Agency Scheme ID 9252 | A 9254 | Identification Scheme Agency 9256 | Scheme 9258 | Identifier 9260 | xsd 9262 | token 9264 | 1..60 9266 | 0..1 9268 | |
| | scheme Agency Scheme Agency ID 9270 | A 9272 | Identification Scheme Agency 9274 | Scheme Agency 9276 | Identifier 9278 | xsd 9280 | token 9282 | 3 9284 | 0..1 9286 | |

Fig. 93

| CDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Contact Person Internal ID 9300 | | | Contact Person 9302 | Internal 9304 | Identification 9306 | Identifier 9308 | GDT 9310 | Contact Person ID 9312 | 1..32 9314 | | Restricted 9316 |
| | scheme ID 9318 | A 9320 | Identification Scheme 9322 | | Identification 9324 | Identifier 9326 | xsd 9328 | token 9330 | 1..60 9332 | 0..1 9334 | |
| | scheme Agency ID 9336 | A 9338 | Identification Scheme Agency 9340 | | Identification 9342 | Identifier 9344 | xsd 9346 | token 9348 | 1..60 9350 | 0..1 9352 | |

Fig 94

| CDT | Obj. Class | Prop. Qual. | Prop. | Rep./ Assn. | Type | Type Name | Lgth. | Remarks |
|---|---|---|---|---|---|---|---|---|
| Contact Person Party ID 9400 | Contact Person 9402 | Party 9404 | Identification 9406 | Identifier 9408 | GDT 9410 | Contact Person ID 9412 | 1..60 9414 | Restricted 9416 |

Fig 95

| GDT | Rep./ Assn. Qual. | Rep./ Assn. | Type | Type Name | Lgth. |
|---|---|---|---|---|---|
| Counter Value 9500 | Counter 9502 | Value 9504 | xsd 9506 | non Negative Integer 9508 | 1..9 9510 |

Fig. 96

| GDT | Rep./ Assn. | Type | Type Name | Lgth. | Card. | Remarks |
|---|---|---|---|---|---|---|
| Country Code 9600 | Country 9602 | Code 9604 | CCT 9606 | Code 9608 | 2..3 9610 | Restricted 9612 |

Fig. 97

| GDT | Obj. Class | Prop. | Rep./ Assn. | Type | Type Name | Lgth. |
|---|---|---|---|---|---|---|
| Credit Agency Report Query Reason Code 9700 | Credit Agency Report Query 9702 | Reason 9704 | Code 9706 | CCT 9708 | Code 9710 | 2 9712 |

Fig. 98

| GDT | Obj. Class | Prop. | Rep./ Assn. | Type | Type Name |
|---|---|---|---|---|---|
| Credit Agency Report Retrieval Permission Indicator 9800 | Credit Agency Report 9802 | Retrieval Permission 9804 | Indicator 9806 | CCT 9808 | Indicator 9810 |

Fig. 99

| GDT | | Cat. | Obj. Class | Prop. | Rep./ Assn. | Type | Type Name | Lgth. | Card. | Remarks |
|---|---|---|---|---|---|---|---|---|---|---|
| Credit Agency Report Scoring 9900 | | | Credit Agency Report 9902 | Scoring 9904 | Details 9906 | | | | | |
| | Score Card ID 9908 | E 9910 | Credit Agency Report Scoring 9912 | Score Card Identification 9914 | Identifier 9916 | GDT 9918 | Score Card ID 9920 | 1..20 9922 | 0..1 9924 | |
| | Result Value 9926 | E 9928 | Credit Agency Report Scoring 9930 | Result 9932 | Value 9934 | GDT 9936 | Decimal Value 9938 | 6.2 9940 | 1 9942 | Restricted 9944 |
| | Descrip-tion 9946 | E 9948 | Credit Agency Report Scoring 9950 | Description 9952 | Text 9954 | GDT 9956 | Description 9958 | | 0..1 9960 | |

Fig. 100

| GDT | Obj. Class | Prop. | Rep./ Assn. | Type | Type Name | Lgth. |
|---|---|---|---|---|---|---|
| Credit Commitment Type Code 10000 | Credit Commitment 10002 | Type 10004 | Code 10006 | CCT 10008 | Code 10010 | 3 10012 |

Fig. 101

| GDT | | Cat. | Obj. Class | Prop. | Rep./ Assn. | Type | Type Name | Lgth. | Card. |
|---|---|---|---|---|---|---|---|---|---|
| Credit Rating Code 10100 | | | Credit 10102 | Rating 10104 | Code 10106 | CCT 10108 | Code 10110 | 1..10 10112 | 1 10114 |
| | list Agency ID 10116 | A 10118 | Code List Agency 10120 | Identification 10122 | Identifier 10124 | xsd 10126 | token 10128 | 1..60 10130 | 0..1 10132 |
| | list Agency Scheme Agency ID 10134 | A 10136 | Code List Agency 10138 | Scheme Agency 10140 | Identifier 10142 | xsd 10144 | token 10146 | 3 10148 | 0..1 10150 |

Fig. 102

| GDT | | Cat. | Obj. Class | Prop. | Rep./ Assn. | Type | Type Name | Lgth. | Card. |
|---|---|---|---|---|---|---|---|---|---|
| Credit Risk Class Code 10200 | | | Credit 10202 | Risk Class 10204 | Code 10206 | CCT 10208 | Code 10210 | 10 10212 | 1 10214 |
| | list Agency ID 10216 | A 10218 | Code List Agency 10220 | Identification 10222 | Identifier 10224 | xsd 10226 | token 10228 | 1..60 10230 | 0..1 10232 |
| | list Agency Scheme Agency ID 10234 | A 10236 | Code List Agency 10238 | Scheme Agency 10240 | Identifier 10242 | xsd 10244 | token 10246 | 3 10248 | 0..1 10250 |

Fig. 103

| GDT | Obj. Class | Prop. | Rep./ Assn. | Type | Type Name | Lgth. | Remarks |
|---|---|---|---|---|---|---|---|
| Credit Segment Internal ID 10300 | Credit Segment 10302 | Internal Identification 10304 | Identifier 10306 | CCT 10308 | Identifier 10310 | 1..10 10312 | Restricted 10314 |

Fig. 104

| GDT | Obj. Class | Prop. | Rep./ Assn. | Type | Type Name | Lgth. |
|---|---|---|---|---|---|---|
| Credit Worthiness Change Reason Code 10400 | Credit Worthiness 10402 | Change Reason 10404 | Code 10406 | CCT 10408 | Code 10410 | 2 10412 |

Fig. 105

| GDT | Obj. Class | Prop. | Rep./ Assn. | Type | Type Name | Lgth. |
|---|---|---|---|---|---|---|
| Credit Worthiness Checking Rule Code 10500 | Credit Worthiness 10502 | Checking Rule 10504 | Code 10506 | CCT 10508 | Code 10510 | 2 10512 |

Fig. 106

| GDT | Obj. Class | Prop. | Rep./ Assn. | Type | Type Name | Lgth. |
|---|---|---|---|---|---|---|
| Credit Worthiness Checking Severity Code 10600 | Credit Worthiness 10602 | Checking Severity 10604 | Code 10606 | CCT 10608 | Code 10610 | 1 10612 |

Fig. 107

| GDT | Obj. Class | Prop. | Rep./ Assn. | Type | Type Name |
|---|---|---|---|---|---|
| Credit Worthiness Indicator 10700 | Credit Worthiness 10702 | Indicator 10704 | Indicator 10706 | CCT 10708 | Indicator 10710 |

Fig. 108

| GDT | Obj. Class | Prop. | Rep./ Assn. | Type | Type Name | Lgth. | Remarks |
|---|---|---|---|---|---|---|---|
| Currency Code 10800 | Currency 10802 | Code 10804 | Code 10806 | CCT 10808 | Code 10810 | 3 10812 | Restricted 10814 |

Fig. 109

| GDT | | Cat. | Obj. Class | Prop. | Rep./ Assn. | Type | Type Name | Lgth. | Card. |
|---|---|---|---|---|---|---|---|---|---|
| Dangerous Goods 10900 | | | Dangerous Goods 10902 | | Details 10904 | | | | |
| | ID 10906 | E 10908 | Dangerous Goods 10910 | Identification 10912 | Identifier 10914 | GDT 10916 | Dangerous Goods ID 10918 | 4 10920 | 0..1 10922 |
| | Regulations Code 10924 | E 10926 | Dangerous Goods 10928 | Regulations 10930 | Code 10932 | GDT 10934 | Dangerous Goods Regulation Code 10936 | 1..3 10938 | 0..1 10940 |
| | Class ID 10942 | E 10944 | Dangerous Goods 10946 | Class 10948 | Identifier 10950 | CCT 10952 | Identifier 10954 | 1..3 10956 | 0..1 10958 |
| | Division ID 10960 | E 10962 | Dangerous Goods 10964 | Division 10966 | Identifier 10968 | CCT 10970 | Identifier 10972 | 1..6 10974 | 0..1 10976 |

Fig. 110

2.75.4 Structure

| GDT | Obj. Class | Prop. | Rep./ Assn. | Type | Type Name | Lgth. |
|---|---|---|---|---|---|---|
| Dangerous Goods ID 11000 | Dangerous Goods 11002 | Identification 11004 | Identifier 11006 | CCT 11008 | Identifier 11010 | 4 11012 |

Fig. 111

| GDT | Obj. Class | Prop. | Rep./ Assn. | Type | Type Name | Lgth. | Card. |
|---|---|---|---|---|---|---|---|
| Dangerous Goods Indicator 11100 | Dangerous Goods 11102 | Indicator 11104 | Indicator 11106 | CCT 11108 | Indicator 11110 | 1 11112 | 0..1 11114 |

Fig. 112

| GDT | Obj. Class | Prop. | Rep./ Assn. | Type | Type Name | Lgth. |
|---|---|---|---|---|---|---|
| Dangerous Goods Regulations Code 11200 | Dangerous Goods 11202 | Regulations 11204 | Code 11206 | CCT 11208 | Code 11210 | 1..3 11212 |

Fig. 113

| GDT | Prop. | Rep./ Assn. | Type | Type Name |
|---|---|---|---|---|
| Date 11300 | Date 11302 | Date 11304 | CCT 11306 | Date 11308 |

Fig. 114

| GDT | | Cat. | Obj. Class | Prop. | Rep./ Assn. | Type | Type Name | Card. |
|---|---|---|---|---|---|---|---|---|
| Date Period 11400 | | | Date Period 11402 | Details 11404 | | | | |
| | Start Date 11406 | E 11408 | Time Period 11410 | Start Date 11412 | Date 11414 | GDT 11416 | Date 11418 | 0..1 11420 |
| | End Date 11422 | E 11424 | Date Period 11426 | End Date 11428 | Date 11430 | GDT 11432 | Date 11434 | 0..1 11436 |
| | Duration 11438 | E 11440 | Date Period 11442 | Duration 11444 | Duration 11446 | GDT 11448 | Duration 11450 | 0..1 11452 |

Fig. 115

| GDT | Prop. | Rep./ Assn. | Type | Type Name |
|---|---|---|---|---|
| Date Time 11500 | Date Time 11502 | Date Time 11504 | CCT 11506 | Date Time 11508 |

Fig. 116

| GDT | | Cat. | Obj. Class | Prop. | Rep./ Assn. | Type | Type Name | Card. |
|---|---|---|---|---|---|---|---|---|
| Date Time Period 11600 | | | Date Time Period 11602 | Details 11604 | | | | |
| | Start Date Time 11606 | E 11608 | Date Time Period 11610 | Start Date Time 11612 | Date Time 11614 | GDT 11616 | Date Time 11618 | 0..1 11620 |
| | End Date Time 11622 | E 11624 | Date Time Period 11626 | End Date Time 11628 | Date Time 11630 | GDT 11632 | Date Time 11634 | 0..1 11636 |
| | Duration 11638 | E 11640 | Date Time Period 11642 | Duration 11644 | Duration 11646 | GDT 11648 | Duration 11650 | 0..1 11652 |

Fig. 117

| GDT | Rep./Assn. Qual. | Rep./ Assn. | Type | Type Name |
|---|---|---|---|---|
| Decimal Value 11700 | Decimal 11702 | Value 11704 | xsd 11706 | Decimal 11708 |

Fig. 118

| GDT | Prop. | Rep./ Assn. | Type | Type Name |
|---|---|---|---|---|
| Deleted Indicator 11800 | Deleted Indicator 11802 | Indicator 11804 | CCT 11806 | Indicator 11808 |

Fig. 119

| GDT | Obj. Class | Prop. | Rep./ Assn. | Type | Type Name | Lgth. |
|---|---|---|---|---|---|---|
| Delivery Schedule Type Code 11900 | Delivery Schedule 11902 | Type 11904 | Code 11906 | CCT 11908 | Code 11910 | 1 11912 |

Fig. 120a

| GDT | | | Cat. | Obj. Class | Prop. | Rep./ Assn. | Type | Type Name | Card. |
|---|---|---|---|---|---|---|---|---|---|
| Delivery Terms 12000 | | | | Delivery Terms 12002 | | Details 12004 | | | |
| | Delivery Item Group ID 12006 | | E 12008 | Delivery Terms 12010 | Order Item Group Identification 12012 | Identifier 12014 | GDT 12012 | Business Transaction Document Item Group ID 12014 | 0...1 12016 |
| | Delivery Priority Code 12018 | | E 12020 | Delivery Terms 12022 | Delivery Priority Code 12024 | Code 12026 | GDT 12028 | Business Transaction Priority Code 12030 | 0...1 12032 |
| | Incoterms 12034 | | E 12036 | Delivery Terms 12038 | Incoterms 12040 | Incoterms 12042 | GDT 12044 | Incoterms 12046 | 0...1 12048 |
| | Partial Delivery 12050 | | E 12052 | Delivery Terms 12054 | Partial Delivery 12056 | Partial Delivery 12058 | GDT 12060 | Partial Delivery 12062 | 0...1 12064 |
| | Quantity Tolerance 12066 | | E 12068 | Delivery Terms 12070 | Quantity Tolerance 12072 | Quantity Tolerance 12074 | GDT 12076 | Quantity Tolerance 12078 | 0...1 12080 |

Fig. 120b

| GDT | | | Cat. | Obj. Class | Prop. | Rep./ Assn. | Type | Type Name | Card. |
|---|---|---|---|---|---|---|---|---|---|
| | Maximum Lead Time Duration 12082 | | E 12084 | Delivery Terms 12086 | Maximum Lead Time 12088 | Duration 12090 | GDT 12092 | Duration 12094 | 0...1 12096 |
| | Transport 12098 | | E 12099 | Delivery Terms 12001A | Transport 12002A | Details 12003A | | | 0..1 12004A |
| | | Service Level Code 12005A | E 12006A | Transport 12007A | Service Level Code 12008A | Code 12009A | GDT 12010A | Transport Service Level Code 12011A | 0...1 12012A |
| | | Mode Code 12013A | E 12014A | Transport 12015A | Mode Code 12016A | Code 12017A | GDT 12018A | Transport Mode Code 12019A | 0...1 12020A |
| | | Means Description Code 12021A | E 12022A | Transport 12023A | Means Description Code 12024A | Code 12025A | GDT 12026A | Transport Means Description Code 12027A | 0...1 12028A |
| | Description 12029A | | E 12030A | Delivery Terms 12031A | Description 12032A | Description 12033A | GDT 12034A | Description 12035A | 0...1 12036A |

Fig. 121

| GDT | | Cat. | Obj. Class | Prop. | Rep./ Assn. | Type | Type Name | Card. | Remarks |
|---|---|---|---|---|---|---|---|---|---|
| Description 12100 | | | Description 12102 | | Text 12104 | CCT 12106 | Text 12108 | | Restricted 12110 |
| | Language Code 12112 | A 12114 | Description 12116 | language Code 12118 | Code 12120 | xsd 12122 | Language 12124 | 1 12126 | |

Fig. 122

| GDT | Rep./Assn. Qual. | Rep./ Assn. | Type | Type Name | Lgth. |
|---|---|---|---|---|---|
| Digit Number Value 12200 | Digit Number 12202 | Value 12204 | xsd 12206 | Non-Negative Integer 12208 | 1..2 12210 |

Fig. 123

| GDT | Prop. | Rep./ Assn. | Type | Type Name |
|---|---|---|---|---|
| Direct Material Indicator 12300 | Direct Material Indicator 12302 | Indicator 12304 | CCT 12306 | Indicator 12308 |

Fig. 124

| GDT | Obj. Class | Prop. | Rep./ Assn. | Type | Type Name |
|---|---|---|---|---|---|
| Dunning Counter Value 12400 | Dunning 12402 | Counter 12404 | Value 12406 | GDT 12408 | Counter Value 12410 |

Fig. 125

| GDT | Obj. Class | Prop. | Rep./ Assn. | Type | Type Name | Lgth. |
|---|---|---|---|---|---|---|
| Dunning Level Value 12500 | Dunning 12502 | Level 12504 | Value 12506 | CCT 12508 | Numeric 12510 | 1 12512 |

Fig. 126

| GDT | Prop. | Rep./ Assn. | Type | Type Name |
|---|---|---|---|---|
| Duration 12600 | Duration 12602 | Date Time 12604 | xsd 12606 | Duration 12608 |

Fig. 127

| GDT | | Cat. | Obj. Class | Prop. | Rep./ Assn. | Type | Type Name | Card. | Remarks |
|---|---|---|---|---|---|---|---|---|---|
| Email Address 12700 | | | Email 12702 | Address 12704 | Electronic Address 12706 | CCT 12708 | Electronic Address 12710 | | Restricted 12712 |
| | Protocol Code 12714 | A 12716 | Email 12718 | Protocol 12720 | Code 12722 | xsd 12724 | token 12726 | 0..1 12728 | Default: EM (smtp) 12730 |

Fig. 128

| GDT | Prop. Qual. | Rep./ Assn. | Type | Type Name |
|---|---|---|---|---|
| Evaluated Receipt Settlement Indicator 12800 | Evaluated Receipt 12802 | Settlement 12804 | CCT 12806 | Indicator 12808 |

Fig. 129

| GDT | | Cat. | Obj. Class | Prop. | Rep./ Assn. | Type | Type Name | Lgth. | Card. |
|---|---|---|---|---|---|---|---|---|---|
| Exchange Rate 12900 | | | Exchange Rate 12902 | | Details 12904 | | | | |
| | Unit Currency 12906 | E 12908 | Exchange Rate 12910 | Unit Currency 12912 | Code 12914 | GDT 12916 | Currency Code 12918 | | 1 12920 |
| | Quoted Currency 12922 | E 12924 | Exchange Rate 12926 | Quoted Currency 12928 | Code 12930 | GDT 12932 | Currency Code 12934 | | 1 12936 |
| | Rate 12938 | E 12940 | Exchange Rate 12942 | Rate 12944 | Rate 12946 | xsd 12948 | Decimal 12950 | 14.14 12952 | 1 12954 |
| | Quotation Date Time 12956 | E 12958 | Exchange Rate 12960 | Quotation Date Time 12962 | Date Time 12964 | GDT 12966 | Date Time 12968 | | 0..1 12970 |

Fig. 130

| GDT | Obj. Class | Rep./ Assn. | Type | Type Name | Lgth. | Remarks |
|---|---|---|---|---|---|---|
| Exponential Rep. Type Code 13000 | Exponential Rep.Type 13002 | Code 13004 | CCT 13006 | Code 13008 | 1 13010 | Restricted 13012 |

Fig. 131

| GDT | Prop. | Rep./ Assn. | Type | Type Name |
|---|---|---|---|---|
| Fixed Indicator 13100 | Fixed 13102 | Indicator 13104 | CCT 13106 | Indicator 13108 |

Fig. 132

| GDT | Rep./ Assn. Qual. | Rep./ Assn. | Type | Type Name |
|---|---|---|---|---|
| Float Value 13200 | Float 13202 | Value 13204 | xsd 13206 | Float 13208 |

Fig. 133

| GDT | Obj. Class Qual. | Obj. Class | Prop. | Rep./ Assn. | Type | Type Name | Lgth. | Remarks |
|---|---|---|---|---|---|---|---|---|
| Follow Up Business Transaction Document Requirement Code 13300 | Follow Up 13302 | Business Transaction Document 13304 | Require-ment 13306 | Code 13308 | CCT 13310 | Code 13312 | 2 13314 | Enumer-ation = "01 02 03 04 05" 13316 |

Fig. 134

| CDT | Obj. Class Qual. | Obj. Class | Prop. | Rep./ Assn. | Type | Type Name | Lgth. | Remarks |
|---|---|---|---|---|---|---|---|---|
| Follow Up Message Requirement Code 13400 | Follow Up 13402 | Message 13404 | Requirement 13406 | Code 13408 | CCT 13410 | Code 13412 | 2 13414 | Restricted 13416 |

Fig. 135

| GDT | | Cat. | Obj. Class | Prop. | Rep./ Assn. | Type | Type Name | Card. |
|---|---|---|---|---|---|---|---|---|
| Geo Coordinates 13500 | | | Geo Coordinates 13502 | | Details 13504 | | | |
| | Latitude Measure 13506 | E 13508 | Geo Coordinates 13510 | Latitude 13512 | Measure 13514 | GDT 13516 | Measure 13518 | 1 13520 |
| | Longitude Measure 13522 | E 13524 | Geo Coordinates 13526 | Longitude 13528 | Measure 13530 | GDT 13532 | Measure 13534 | 1 13536 |

Fig. 136a

| | Data Type | | Obj. Class | Prop. Qual. | Prop. | Rep./ Assn. | Type | Type Name | Lgth. | Card. | Remarks |
|---|---|---|---|---|---|---|---|---|---|---|---|
| Handling Unit 13600 | | | Handling Unit 13602 | | | Details 13604 | | | | | |
| | ID 13606 | | Handling Unit 13608 | | Identifi-cation 13610 | Identifier 13612 | GDT 13614 | Identifier 13616 | 1..20 13618 | 1 13620 | |
| | Load Carrier 13622 | | Handling Unit 13624 | | | | | | | 1 13626 | |
| | | Product 13626 | Load Carrier 13628 | | Product 13630 | | GDT | Business Transaction Document Product 13632 | | 1 13634 | Restricted 13636 |
| | Height Measure 13638 | | Handling Unit 13640 | Height 13642 | Measure 13644 | Measure 13646 | GDT 13648 | Measure 13650 | 19.6 13652 | 0..1 13654 | |

Fig. 136b

| Data Type | Obj. Class | Prop. Qual. | Prop. | Rep./ Assn. | Type | Type Name | Lgth. | Card. | Remarks |
|---|---|---|---|---|---|---|---|---|---|
| Lgth. Measure 13656 | Handling Unit 13658 | Lgth. 13660 | Measure 13662 | Measure 13664 | GDT 13666 | Measure 13668 | 19.6 13670 | 0..1 13672 | |
| Width Measure 13674 | Handling Unit 13676 | Width 13678 | Measure 13680 | Measure 13682 | GDT 13684 | Measure 13686 | 19.6 13688 | 0..1 13690 | |
| Gross Volume Measure 13692 | Handling Unit 13694 | Volume 13696 | Measure 13698 | Measure 13699 | GDT 13601A | Measure 13602A | 19.6 13603A | 0..1 13604A | |
| Gross Weight Measure 13605A | Handling Unit 13606A | Weight 13607A | Measure 13608A | Measure 13609A | GDT 13610A | Measure 13611A | 19.6 13612A | 0..1 13613A | |
| Additional Packaging 13614A | Handling Unit 13615A | | | | | | | 0..n 13616A | |

Fig. 136c

| Data Type | | | | Obj. Class | Prop. Qual. | Prop. | Rep./ Assn. | Type | Type Name | Lgth. | Card. | Remarks |
|---|---|---|---|---|---|---|---|---|---|---|---|---|
| | | Product 13616A | | Additional Packaging 13617A | | Product 13618A | | GDT 13619A | Business Transaction Document Product 13620A | | 1 13621A | Restricted 13622A |
| | | Quantity 13623A | | Additional Packaging 13624A | | Quantity 13625A | Quantity 13626A | GDT 13627A | Quantity 13628A | 19.6 13629A | 1 13630A | |
| | Lower Level Hand-ling Unit 13631A | | | Handling Unit 13632A | | | | | | | 0..n 13633A | |

Fig. 136d

| | Data Type | | | Obj. Class | Prop. Qual. | Prop. | Rep./ Assn. | Type | Type Name | Lgth. | Card. | Remarks |
|---|---|---|---|---|---|---|---|---|---|---|---|---|
| | | ID 13634A | | Lower Level Handling Unit 13635A | | Identifica-tion 13636A | Identifier 13637A | GDT 13638A | Handling Unit ID 13639A | 1..20 13640A | 1 13641A | |

Fig. 136e

| Data Type | | Obj. Class | Prop. Qual. | Prop. | Rep./ Assn. | Type | Type Name | Lgth. | Card. | Remarks |
|---|---|---|---|---|---|---|---|---|---|---|
| Load 13642A | | Handling Unit 13643A | | Load 13644A | | | | | 0..n 13645A | |
| Business Transaction Document Reference 13645A | | Load 13646A | | Business Transaction Document 13647A | | GDT 13648A | Business Transaction Document Reference 13649A | | 1 13650A | |
| | ID 13651A | Business Transaction Document 13652A | | Identification 13653A | Identifier 13654A | GDT 13655A | Business Transaction Document ID 13656A | 1..35 13657A | 0..1 13658A | |
| | Item ID 13659A | Business Transaction Document Item 13660A | | Identification 13661A | Identifier 13662A | GDT 13663A | Business Transaction Document Item ID 13664A | 1..10 13665A | 1 13666A | |
| Quantity 13666A | | Load 13667A | | Quantity 13668A | Quantity 13669A | GDT 13670A | Quantity 13671A | 19.6 13672A | 1 13673A | |

Fig. 137

| GDT | | Cat. | Obj. Class | Prop. | Rep./ Assn. | Type | Data Type | Lgth. | Card. | Remarks |
|---|---|---|---|---|---|---|---|---|---|---|
| Incoterms 13700 | | | Incoterms 13702 | | Details 13704 | | | | | |
| | Classification Code 13706 | E 13708 | Incoterms 13710 | Classifi-cation 13712 | Code 13714 | CCT 13716 | Code 13718 | 3 13720 | 1 13722 | Restricted 13724 |
| | Transfer Location Name 13726 | E 13728 | Incoterms 13730 | Transfer Location Name 13732 | Name 13734 | GDT 13736 | Name 13738 | 1..28 13740 | 0..1 13742 | Restricted 13744 |

Fig. 138

| GDT | Obj. Class | Prop. | Rep./ Assn. | Type | Type Name |
|---|---|---|---|---|---|
| Information Outdated Indicator 13800 | Information 13802 | Outdated Indicator 13804 | Indicator 13806 | CCT 13808 | Indicator 13810 |

Fig. 139

| GDT | Rep./ Assn. Qual. | Rep./ Assn. | Type | Type Name |
|---|---|---|---|---|
| Integer Value 13900 | Integer 13902 | Value 13904 | xsd 13906 | Integer 13908 |

Fig. 140

| GDT | | Cat. | Obj. Class | Prop. | Rep./ Assn. | Type | Type Name | Lgth. | Card. | Remarks |
|---|---|---|---|---|---|---|---|---|---|---|
| Interface Element ID 14000 | | | Interface Element 14002 | | Identifier 14004 | CCT 14006 | Identifier 14008 | 1..40 14010 | | Restricted 14012 |
| | Scheme ID 14014 | A 14016 | Identification Scheme 14018 | | Identifier 14020 | xsd 14022 | token 14024 | 1..60 14026 | 0..1 14028 | |
| | Scheme Agency ID 14030 | A 14032 | Identification Scheme Agency 14034 | | Identifier 14036 | xsd 14038 | token 14040 | 1..60 14042 | 0..1 14044 | |
| | Scheme Agency Scheme ID 14046 | A 14048 | Identification Scheme Agency 14050 | Scheme 14052 | Identifier 14054 | xsd 14056 | token 14058 | 1..60 14060 | 0..1 14062 | |
| | Scheme Agency Scheme Agency ID 14064 | A 14066 | Identification Scheme Agency 14068 | Scheme Agency 14070 | Identifier 14072 | xsd 14074 | token 14076 | 3 14078 | 0..1 14080 | |

Fig. 141

| GDT | Prop. | Rep./ Assn. | Type | Type Name | Lgth. | Remarks |
|---|---|---|---|---|---|---|
| Interval Boundary Type Code 14100 | Interval Boundary Type 14102 | Code 14104 | CCT 14106 | Code 14108 | 1 14110 | Restricted 14112 |

Fig. 142

| GDT | Obj. Class | Prop. | Rep./ Assn. | Type | Type Name | Lgth. | Remarks |
|---|---|---|---|---|---|---|---|
| Inventory Usability Status Code 14200 | Inventory 14202 | Usability Status 14204 | Code 14206 | CCT 14208 | Code 14210 | 1..2 14212 | Restricted 14214 |

Fig. 143

| GDT | Obj. Class | Prop. | Rep./ Assn. | Type | Type Name |
|---|---|---|---|---|---|
| Invoice Cancellation Invoice Indicator 14300 | Invoice 14302 | Cancellation Invoice Indicator 14304 | Indicator 14306 | CCT 14308 | Indicator 14310 |

Fig. 144

| GDT | Obj. Class | Prop. | Rep./ Assn. | Type | Type Name |
|---|---|---|---|---|---|
| Invoice IntraCorporate Indicator 14400 | Invoice 14402 | IntraCorporate Indicator 14404 | Indicator 14406 | CCT 14408 | Indicator 14410 |

Fig. 145

| GDT | Obj. Class | Prop. Term | Rep. | Type | Type Name | Lgth. |
|---|---|---|---|---|---|---|
| Language Code 14500 | Language 14502 | Identification 14504 | Code 14506 | xsd 14508 | language 14510 | 2..9 14512 |

Fig. 146

| GDT | Prop. | Rep./ Assn. | Type |
|---|---|---|---|
| Language Dependency Indicator 14600 | Language Dependency 14602 | Indicator 14604 | CCT: Indicator 14606 |

Fig. 147

| GDT | Obj. Class | Prop. | Rep./ Assn. | Type | Type Name | Lgth. |
|---|---|---|---|---|---|---|
| Legal Event Type Code 14700 | Legal Event 14702 | Type 14704 | Code 14706 | CCT 14708 | Code 14710 | 2 14712 |

Fig. 148

| GDT | | Cat. | Obj. Class | Prop. | Rep./ Assn. | Type | Type Name | Lgth. | Card. | Remarks |
|---|---|---|---|---|---|---|---|---|---|---|
| Location ID 14800 | | | Location 14802 | Identification 14804 | Identifier 14806 | CCT 14808 | | 20 14812 | | Restricted 14814 |
| | Scheme ID 14816 | A 14818 | Identification Scheme 14820 | Identification 14822 | Identifier 14824 | xsd 14826 | token 14828 | 0..60 14830 | 0..1 14832 | |
| | Scheme Agency ID 14834 | A 14836 | Identification Scheme Agency 14838 | Identification 14840 | Identifier 14842 | xsd 14844 | token 14846 | 0..60 14850 | 0..1 14852 | |
| | Scheme Agency Scheme ID 14854 | A 14856 | Identification Scheme Agency 14858 | Scheme 14860 | Identifier 14862 | xsd 14864 | token 14866 | 0..60 14868 | 0..1 14870 | |
| | Scheme Agency-Scheme Agency ID 14872 | A 14874 | Identification Scheme Agency 14876 | Scheme Agency 14878 | Identifier 14880 | xsd 14882 | token 14884 | 3 14886 | 0..1 14888 | |

Fig. 149

| CDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Location Internal ID 14900 | | | Location 14902 | Internal 14904 | Identifi- cation 14906 | Identifier 14908 | GDT 14910 | Location ID 14912 | 1..32 14914 | | Restricted 14916 |
| | Scheme ID 14918 | A 14920 | Identification Scheme 14920 | | Identifi- cation 14922 | Identifier 14924 | xsd 14926 | token 14928 | 1..60 14930 | 0..1 14932 | |
| | Scheme Agency ID 14934 | A 14936 | Identification Scheme Agency 14938 | | Identifi- cation 14938 | Identifier 14940 | xsd 14942 | token 14944 | 1..60 14946 | 0..1 14948 | |

Fig. 150

| CDT | Obj. Class | Prop. Qual. | Prop. | Rep./ Assn. | Type | Type Name | Lgth. | Remarks |
|---|---|---|---|---|---|---|---|---|
| Location Party ID 15000 | Location 15002 | Party 15004 | Identification 15006 | Identifier 15008 | GDT 15010 | Location ID 15012 | 1..20 15014 | Restricted 15016 |

Fig. 151

| CDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Location Standard ID 15100 | | | Location 15102 | Standard 15104 | Identification 15106 | Identifier 15108 | GDT 15110 | Location ID 15112 | 13 15114 | | Restricted 15116 |
| | Scheme Agency ID 15118 | A 15120 | Identification Scheme Agency 15122 | | Identification 15124 | Identifier 15126 | xsd 15128 | token 15130 | 3 15132 | 1 15134 | |

Fig. 152

| GDT | | Cat. | Obj. Class | Prop. | Rep./ Assn. | Type | Type Name | Lgth. | Card. | Remarks |
|---|---|---|---|---|---|---|---|---|---|---|
| Log Item 15200 | | | | | Details 15202 | | | | | |
| | Type ID 15204 | E 15206 | Log Item 15208 | Type Identification 15210 | Identifier 15212 | CCT 15214 | Identifier 15216 | 1..40 15218 | 0..1 15220 | Restricted 15222 |
| | Severity Code 15224 | E 15226 | Log Item 15228 | Severity 15230 | Code 15232 | GDT 15234 | Log Item Severity Code 15236 | | 0..1 15238 | |
| | Note 15240 | E 15242 | Log Item 15244 | Note 15246 | Note 15248 | GDT 15250 | Note 15252 | 1..200 15254 | 1 15256 | Restricted 15258 |
| | Web Address 15260 | E 15262 | Log Item 15264 | Web Address 15266 | Web Address 15268 | CCT 15270 | Web Address 15272 | | 0..1 15274 | |

Fig. 153

| GDT | Obj. Class | Prop. | Rep./ Assn. | Type | Type Name | Lgth. |
|---|---|---|---|---|---|---|
| Log Item Severity Code 15300 | Log Item 15302 | Severity 15304 | Code 15306 | CCT 15308 | Code 15310 | 1 15312 |

Fig. 154

| GDT | | Cat. | Obj. Class | Prop. | Rep./ Assn. | Type | Type Name | Lgth. | Card. |
|---|---|---|---|---|---|---|---|---|---|
| Measure 15400 | | | | | Measure 15402 | xsd 15404 | decimal 15406 | 13.6 15408 | |
| | Unit Code 15410 | A 15412 | Measure 15414 | Unit 15416 | Code 15418 | xsd 15420 | token 15422 | 1..3 15424 | 1 15426 |

Fig. 155

| GDT | Obj. Class | Rep./ Assn. | Type | Type Name | Lgth. |
|---|---|---|---|---|---|
| Measure Unit Code 15500 | Measure Unit 15502 | Code 15504 | xsd 15506 | token 15508 | 1..3 15510 |

Fig. 156

| GDT | Obj. Class | Prop. | Rep./ Assn. | Type | Type Name | Lgth. | Remarks |
|---|---|---|---|---|---|---|---|
| Measure Unit Meaning Code 15600 | Measure Unit 15602 | Meaning 15604 | Code 15606 | CCT 15608 | Code 15610 | 3 15612 | Restricted 15614 |

Fig. 157

| GDT | Obj. Class | Prop. | Rep./ Assn. | Type | Type Name | Lgth. | Remarks |
|---|---|---|---|---|---|---|---|
| Message Type Code 15700 | Message 15702 | Type Code 15704 | Code 15706 | CCT 15708 | Code 15710 | 4 15712 | Restricted 15714 |

Fig. 158

| GDT | | Cat. | Obj. Class | Prop. | Rep./ Assn. | Type | Type Name | Lgth. | Card. |
|---|---|---|---|---|---|---|---|---|---|
| Name 15800 | | | Name 15802 | | Text 15804 | CCT 15806 | Text 15808 | | |
| | Language Code 15810 | A 15812 | Name 15814 | language Code 15816 | Code 15818 | xsd 15820 | language 15822 | 2..5 15824 | 0..1 15826 |

Fig. 159

| GDT | Prop. | Rep./ Assn. | Type | Type Name | Remarks |
|---|---|---|---|---|---|
| Note 15900 | Note 15902 | Text 15904 | CCT 15906 | Text 15908 | Restricted 15910 |

Fig. 160

| GDT | Obj. Class | Prop. | Rep./ Assn. | Type | Type Name | Lgth. | Remarks |
|---|---|---|---|---|---|---|---|
| Object Structure Relationship Type Code 16000 | Object Structure Relationship 16002 | Type Code 16004 | Code 16006 | CCT 16008 | Code 16010 | 3 16012 | Restricted 16014 |

Fig. 161

| GDT | Rep./Assn. Qual. | Rep./ Assn. | Type | Type Name | Lgth. |
|---|---|---|---|---|---|
| Ordinal Number Value 16100 | Ordinal Number 16102 | Value 16104 | xsd 16106 | Positive Integer 16108 | 1..9 16110 |

Fig. 162

| GDT | Cat. | Obj. Class | Prop. | Rep./ Assn. | Type | Type Name | Lgth. | Card. | Remarks |
|---|---|---|---|---|---|---|---|---|---|
| Partial Delivery 16200 | | Partial Delivery 16202 | | Details 16204 | | | | | |
| | E 16206 | Partial Delivery 16208 | Maximal Number 16210 | Integer 16212 | GDT 16214 | Integer Value 16216 | 1 16218 | 0..1 16220 | Zero not allowed 16222 |
| | E 16224 | Partial Delivery 16226 | Unlimited Indicator 16228 | Indicator 16230 | GDT 16232 | Value Unlimited Indicator 16234 | 1 16236 | 0..1 16238 | |

Fig. 163

| GDT | | Cat. | Obj. Class | Prop. | Rep./ Assn. | Type | Type Name | Lgth. | Card. | Remarks |
|---|---|---|---|---|---|---|---|---|---|---|
| Party ID 16300 | | | Party 16302 | Identification 16304 | Identifier 16306 | CCT 16308 | Identifier 16310 | 1..60 16312 | | Restricted 16314 |
| | scheme ID 16316 | A 16318 | Identification Scheme 16320 | Identification 16322 | Identifier 16324 | xsd 16326 | token 16328 | 1..60 16330 | 0..1 16332 | |
| | scheme Agency ID 16334 | A 16336 | Identification Scheme Agency 16338 | Identification 16340 | Identifier 16342 | xsd 16344 | token 16346 | 1..60 16348 | 0..1 16350 | |
| | scheme Agency Scheme ID 16352 | A 16354 | Identification Scheme Agency 16356 | Scheme 16358 | Identifier 16360 | xsd 16362 | token 16364 | 1..60 16366 | 0..1 16368 | |
| | scheme Agency Scheme Agency ID 16370 | A 16372 | Identification Scheme Agency 16374 | Scheme Agency 16376 | Identifier 16378 | xsd 16380 | token 16382 | 3 16384 | 0..1 16386 | |

Fig. 164

| CDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Party Internal ID 16400 | | | Party 16402 | Internal 16404 | Identification 16406 | Identifier 16408 | GDT 16410 | Party ID 16412 | 1..32 16414 | | Restricted 16416 |
| | scheme ID 16418 | A 16420 | Identification Scheme 16422 | | Identification 16424 | Identifier 16426 | xsd 16428 | token 16430 | 1..60 16432 | 0..1 16434 | |
| | scheme Agency ID 16436 | A 16438 | Identification Scheme Agency 16440 | | Identification 16442 | Identifier 16444 | xsd1 16446 | token 16448 | 1..60 16450 | 0..1 16452 | |

Fig. 165

| CDT | Obj. Class | Prop. Qual. | Prop. | Rep./ Assn. | Type | Type Name | Lgth. | Remarks |
|---|---|---|---|---|---|---|---|---|
| Party Party ID 16500 | Party 16502 | Party 16504 | Identification 16506 | Identifier 16508 | GDT 16510 | Party ID 16512 | 1..60 16514 | Restricted 16516 |

Fig. 166

| CDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Party Standard ID 16600 | | | Party 16602 | Standard 16604 | Identification 16606 | Identifier 16608 | GDT 16610 | Party ID 16612 | 1..13 16614 | | Restricted 16616 |
| | scheme Agency ID 16618 | A 16620 | Identification Scheme Agency 16622 | | Identification 16624 | Identifier 16626 | xsd 16628 | token 16630 | 3 16632 | 1 16634 | |

Fig. 167

| GDT | | Cat. | Obj. Class | Prop. | Rep./ Assn. | Type | Type Name | Lgth. | Card. | Remarks |
|---|---|---|---|---|---|---|---|---|---|---|
| Payment Card 16700 | | | Payment Card 16702 | | Details 16704 | | | | | |
| | ID 16706 | E 16708 | Payment Card 16710 | Identifica-tion 16712 | Identifier 16714 | GDT 16716 | Payment Card ID 16718 | | 1 16720 | |
| | Reference ID 16722 | E 16724 | Payment Card 16726 | Reference Identifica-tion 16728 | Identifier 16730 | CCT 16732 | Identifier 16734 | 1..25 16736 | 0..1 16738 | Restricted 16740 |
| | Sequence ID 16740 | E 16742 | Payment Card 16744 | Sequence Identifica-tion 16746 | Identifier 16748 | CCT 16750 | Identifier 16752 | 1..10 16754 | 0..1 16756 | Restricted 16758 |
| | Holder 16760 | E 16762 | Payment Card 16764 | Holder 16766 | Text 16768 | CCT 16770 | text 16772 | 1..40 16774 | 0..1 16776 | |
| | Expiration Date 16778 | E 16780 | Payment Card 16782 | Expiration Date 16784 | Date 16786 | GDT 16788 | Date 16790 | | 1 16792 | |

Fig. 168

| GDT | | Cat. | Obj. Class | Prop. | Rep./ Assn. | Type | Type Name | Lgth. | Card. | Remarks |
|---|---|---|---|---|---|---|---|---|---|---|
| Payment Card ID 16800 | | E 16802 | Payment Card 16804 | Identification 16806 | Identifier 16808 | CCT 16810 | Identifier 16812 | 1..25 16814 | 1 16816 | Restricted 16818 |
| | scheme ID 16820 | A 16822 | Identification Scheme 16824 | Identification 16826 | Identifier 16828 | xsd 16830 | token 16832 | 1..60 16834 | 1 16836 | |
| | scheme Agency ID 16838 | A 16840 | Identification Scheme Agency 16842 | Identification 16844 | Identifier 16846 | xsd 16848 | token 16850 | 1..60 16852 | 1 16854 | |
| | scheme Agency Scheme ID 16856 | A 16858 | Identification Scheme Agency 16860 | Scheme 16862 | Identifier 16864 | xsd 16866 | token 16868 | 1..60 16870 | 0..1 16872 | |
| | scheme Agency Scheme Agency ID 16874 | A 16876 | Identification Scheme Agency 16878 | Scheme Agency 16880 | Identifier 16882 | xsd 16884 | token 16886 | 3 16888 | 0..1 16890 | |

Fig. 169

| CDT | Obj. Class | Prop. | Rep./ Assn. | Type | Type Name | Lgth. | Remarks |
|---|---|---|---|---|---|---|---|
| Payment Form Code 16900 | Payment 16902 | Form Code 16904 | Code 16906 | CCT 16908 | Code 16910 | 2 16912 | Restricted 16914 |

Fig. 170

| GDT | Cat. | Rep./ Assn. | Type | Type Name | Lgth. |
|---|---|---|---|---|---|
| Percent 17000 | E 17002 | Percent 17004 | xsd 17006 | decimal 17008 | 10.6 17010 |

Fig. 171a

| GDT Person-Name | | | Cat. | Obj. Class | Prop. | Rep./ Assn. | Type | Type Name | Lgth. | Card. | Remarks |
|---|---|---|---|---|---|---|---|---|---|---|---|
| Person Name 17100 | | | E 17102 | Person Name 17104 | | Details 17106 | | | | | |
| | Formatted Name 17108 | | E 17110 | Person Name 17112 | For-matted Name 17114 | Name 17116 | xsd 17118 | string 17120 | ..80 17122 | 0..1 17124 | |
| | Legal Name 17126 | | E 17128 | Person Name 17130 | Legal Name 17132 | Name 17134 | xsd 17136 | string 17138 | ..80 17140 | 0..1 17142 | |
| | Given Name 17144 | | E 17146 | Person Name 17148 | Given Name 17150 | Name 17152 | xsd 17154 | string 17156 | ..40 17158 | 0.. un-bounded 17160 | |
| | Preferred Given Name 17162 | | E 17164 | Person Name 17166 | Pre-ferred Given Name 17168 | Name 17170 | xsd 17172 | string 17174 | ..40 17176 | 0..1 17178 | |
| | Middle Name 17180 | | E 17182 | Person Name 17184 | Middle Name 17186 | Name 17188 | xsd 17190 | string 17192 | ..40 17194 | 0.. un-bounded 17196 | |

Fig. 171b

| GDT Person-Name | | | Cat. | Obj. Class | Prop. | Rep./ Assn. | Type | Type Name | Lgth. | Card. | Remarks |
|---|---|---|---|---|---|---|---|---|---|---|---|
| | Family 17198 | | E 17101 | Person Name 17103 | Family 17105 | Detail 17107 | | | | 0.. unbounded 17109 | |
| | | Family Name 17111 | E 17113 | Family 17113 | Family Name 17115 | Name 17117 | xsd 17119 | string 17121 | ..40 17123 | 1 17125 | |
| | | Primary Indicator 17127 | E 17129 | Family 17131 | Family Name Primary Code 17133 | Code 17135 | CCT 17137 | Indicator 17139 | 1 17141 | 0..1 17143 | No default value 17145 |
| | | Family Name Prefix 17147 | E 17149 | Family 17151 | Family Name Prefix 17153 | Text 17155 | xsd 17157 | string 17159 | ..20 17161 | 0..1 17163 | Different from the HR-XML Proposal 17165 |
| | Affix 17167 | | E 17169 | Person Name 17171 | Affix 17173 | Detail 17175 | | | | 0.. unbounded 17177 | |
| | | Affix Name 17179 | E 17181 | Affix 17183 | Affix 17185 | Name 17187 | xsd 17189 | string 17191 | ..20 17193 | 1 17195 | |

Fig. 171c

| GDT Person Name | | | Cat. | Obj. Class | Prop. | Rep./ Assn. | Type | Type Name | Lgth. | Card. | Remarks |
|---|---|---|---|---|---|---|---|---|---|---|---|
| | | Affix Code 17197 | E 17199 | Affix 17102a | Affix Code 17104a | Code 17106a | CCT 17108a | Code 17110a | 1..20 17112a | 1 17114a | |

Fig. 172

| GDT | | Cat. | Obj. Class | Prop. | Rep./ Assn. | Type | Type Name | Lgth. | Card. | Remarks |
|---|---|---|---|---|---|---|---|---|---|---|
| Personnel Time Event ID 17200 | | | Personnel Time Event 17202 | Identification 17204 | Identifier 17206 | GDT 17208 | Identifier 17210 | 1..40 17212 | | Restricted 17214 |
| | scheme ID 17216 | A 17218 | Identification Scheme 17220 | Identification 17222 | Identifier 17224 | xsd 17226 | token 17227 | 1..60 17230 | 0..1 1 17232 | |
| | scheme Agency ID 17234 | A 17236 | Identification Scheme Agency 17238 | Identification 17240 | Identifier 17242 | xsd 17244 | token 17246 | 1..60 17248 | 0..1 17250 | |

Fig. 173

| GDT | | Cat. | Obj. Class | Prop. | Rep./ Assn. | Type | Type Name | Lgth. | Card. | Remarks |
|---|---|---|---|---|---|---|---|---|---|---|
| Personnel Time Event Type ID 17300 | | | Personnel Time Event Type 17302 | Identification 17304 | Identifier 17306 | GDT 17308 | Identifier 17310 | 1..40 17312 | | Restricted 17314 |
| | scheme ID 17316 | A 17318 | Identification Scheme 17320 | Identification 17322 | Identifier 17324 | xsd 17326 | token 17328 | 1..60 17330 | 0..1 17332 | |
| | scheme Agency ID 17334 | A 17336 | Identification Scheme Agency 17338 | Identification 17340 | Identifier 17342 | xsd 17344 | token 17346 | 1..60 17348 | 0..1 17350 | |

Fig. 174

| GDT | | Cat. | Obj. Class | Prop. | Rep./ Assn. | Type | Type Name | Lgth. | Card. | Remarks |
|---|---|---|---|---|---|---|---|---|---|---|
| Personnel Time ID 17400 | | | Personnel Time 17402 | Identification 17404 | Identifier 17406 | GDT 17408 | Identifier 17410 | 1..40 17412 | | Restricted 17414 |
| | scheme ID 17416 | A 17418 | Identification Scheme 17420 | Identification 17422 | Identifier 17424 | xsd 17426 | token 17428 | 1..60 17430 | 0..1 17432 | |
| | scheme Agency ID 17434 | A 17436 | Identification Scheme Agency 17438 | Identification 17440 | Identifier 17442 | xsd 17444 | token 17446 | 1..60 17448 | 0..1 17450 | |

Fig. 175

| GDT | | Cat. | Obj. Class | Prop. | Rep./ Assn. | Type | Type Name | Lgth. | Card. | Remarks |
|---|---|---|---|---|---|---|---|---|---|---|
| Personnel Time Type ID 17500 | | | Personnel Time Type 17502 | Identification 17504 | Identifier 17506 | GDT 17508 | Identifier 17510 | 1..40 17512 | | Restricted 17514 |
| | scheme ID 17516 | A 17518 | Identification Scheme 17520 | Identification 17522 | Identifier 17524 | xsd 17526 | token 17528 | 1..60 17530 | 0..1 17532 | |
| | scheme Agency ID 17534 | A 17536 | Identification Scheme Agency 17538 | Identification 17540 | Identifier 17542 | xsd 17544 | token 17546 | 1..60 17548 | 0..1 17550 | |

Fig. 176

| GDT | | Cat. | Obj. Class | Prop. | Rep./ Assn. | Type | Type Name | Lgth. | Card. | Remarks |
|---|---|---|---|---|---|---|---|---|---|---|
| Phone Number 17600 | | | Phone Number 17602 | | Details 17604 | | | | | |
| | Area ID 17606 | E 17608 | Phone Number 17610 | Phone Number Area 17612 | Identifier 17614 | CCT 17616 | Identifier 17618 | 1..10 17620 | 0..1 17622 | Restricted 17624 |
| | Subscriber ID 17626 | E 17628 | Phone Number 17630 | Phone Number Sub-scriber 17632 | Identifier 17634 | CCT 17636 | Identifier 17638 | 1..30 17640 | 0..1 17642 | Restricted 17644 |
| | Extension ID 17646 | E 17648 | Phone Number 17650 | Phone Number Exten-sion 17652 | Identifier 17654 | CCT 17656 | Identifier 17658 | 1..10 17660 | 0..1 17662 | Restricted 17664 |
| | Country Code 17666 | E 17668 | Phone Number 17670 | Phone Number Country 17672 | Code 17674 | GDT 17676 | Country Code 17678 | | 0..1 17680 | |

Fig. 177

| GDT | | Cat. | Obj. Class | Prop. | Rep./ Assn. | Type | Type Name |
|---|---|---|---|---|---|---|---|
| Price 17700 | | | Price 17702 | | Details 17704 | | |
| | Amount 17706 | E 17708 | Price 17710 | Amount 17712 | Amount 17714 | GDT 17716 | Amount 17718 |
| | Base Quantity 17720 | E 17722 | Price 17724 | Base 17726 | Quantity 17728 | GDT 17730 | Quantity 17732 |

Fig. 178

| GDT | | Cat. | Obj. Class | Prop. | Rep./ Assn. | Type | Type Name | Lgth. | Card. |
|---|---|---|---|---|---|---|---|---|---|
| Price Component 17800 | | C 17802 | Price Component 17804 | | Details 17806 | | | | |
| | Type Code 17808 | E 17810 | Price Component 17812 | Type Code 17814 | Code 17816 | GDT 17818 | Price Component Type Code 17820 | 4 17822 | 1 17824 |
| | Description 17826 | E 17828 | Price Component 17830 | Description 17832 | Text 17834 | GDT 17836 | Description 17838 | | 0..1 17840 |
| | Base Amount 17842 | E 17844 | Price Component 17846 | Base Amount 17848 | Amount 17850 | GDT 17852 | Amount 17854 | | 0..1 17856 |
| | Percent 17858 | E 17860 | Price Component 17862 | Percent 17864 | Percent 17866 | GDT 17868 | Percent 17870 | | 0..1 17872 |
| | Amount 17874 | E 17876 | Price Component 17878 | Amount 17880 | Amount 17882 | GDT 17884 | Amount 17886 | | 1 17888 |

Fig. 179

| GDT | Obj. Class | Prop. | Rep./ Assn. | Type | Type Name | Lgth. |
| --- | --- | --- | --- | --- | --- | --- |
| Price Component Type Code 17900 | Price Component 17902 | Type Code 17904 | Code 17906 | CCT 17908 | Code 17910 | 4 17912 |

Fig. 180

| CDT | | | Cat. | Obj. Class Qual. | Obj. Class | Prop. | Rep./ Assn. | Type | Type Name | Card. | Remarks |
|---|---|---|---|---|---|---|---|---|---|---|---|
| Price Time Series 18000 | | | | Price 18002 | Time Series 18004 | | Details 18006 | GDT 18008 | Time Series 18010 | | Restricted 18012 |
| | Item 18014 | | E 18016 | | Time Series 18018 | Item 18020 | Details 18022 | | | 1..n 18024 | |
| | | Validity-Period 18026 | E 18028 | | Time Series 18030 | Validity Period 18032 | Details 18034 | GDT 18036 | Date Time Period 18038 | 1 18040 | |
| | | Price 18040 | E 18042 | | Time Series 18042 | Price 18044 | Price 18046 | GDT 18048 | Price 18050 | 1 18052 | |
| | | Fixed-Indicator 18054 | E 18056 | | Time Series 18058 | Fixed Indicator 18060 | Indicator 18062 | GDT 18064 | Fixed Indicator 18066 | 0..1 18068 | |

Fig. 181a

| GDT | | | Cat. | Obj. Class | Prop. | Rep./ Assn. | Type | Type Name | Card. |
|---|---|---|---|---|---|---|---|---|---|
| Procure-ment Cost Upper Limit 18100 | | | | Procure-ment Cost 18102 | Upper Limit 18104 | Details 18106 | | | |
| | Overall Limit 18108 | | E 18110 | Procure-ment Cost Upper Limit 18112 | Overall Limit 18114 | Details 18116 | | | 1 18118 |
| | | Amount 18120 | E 18122 | Overall Limit 18124 | Amount 18124 | Amount 18126 | GDT 18128 | Amount 18130 | 0..1 18132 |
| | | Amount Unlimited Indicator 18134 | E 18136 | Overall Limit 18138 | Amount Unlimited Indicator 18140 | Indicator 18142 | GDT 18144 | Value Unlimited Indicator 18146 | 0..1 18148 |
| | | Expected Amount 18150 | E 18152 | Overall Limit 18154 | Expected Amount 18156 | Amount 18158 | GDT 18160 | Amount 18162 | 0..1 18164 |

Fig. 181b

| GDT | | | Cat. | Obj. Class | Prop. | Rep./ Assn. | Type | Type Name | Card. |
|---|---|---|---|---|---|---|---|---|---|
| | Contract Partial Limit 18166 | | E 18168 | Procure-ment Cost Upper Limit 18170 | Contract Partial Limit 18172 | Details 18174 | | | 0..n 18176 |
| | | Amount 18178 | E 18180 | Contract Partial Limit 18182 | Amount 18184 | Amount 18186 | GDT 18188 | Amount 18190 | 0..1 18192 |
| | | Amount Unlimited Indicator 18194 | E 18196 | Contract Partial Limit 18198 | Amount Unlimited Indicator 181100 | Indicator 181102 | GDT 181104 | Value Unlimited 181106 | 0..1 181108 |
| | | Contract Refer-ence 181110 | E 181112 | Contract Partial Limit 181114 | Contract Reference 181116 | Business Transaction Document Reference 181118 | GDT 181120 | Business Trans-action Document Reference 181122 | 1 181124 |

Fig. 181c

| GDT | | | Cat. | Obj. Class | Prop. | Rep./ Assn. | Type | Type Name | Card. |
|---|---|---|---|---|---|---|---|---|---|
| | Miscel-laneous Partial Limit 181126 | | E 181128 | Procure-ment Cost Upper Limit 181130 | Miscellane-ous Partial Limit 181132 | Details 181134 | | | 0..1 181136 |
| | | Amount 181138 | E 181140 | Miscel-laneous Partial Limit 181142 | Amount 181144 | Amount 181146 | GDT 181148 | Amount 181150 | 0..1 181152 |
| | | Amount Unlimited Indicator 181154 | E 181156 | Miscel-laneous Partial Limit 181158 | Amount Unlimited Indicator 181160 | Indicator 181162 | GDT 181164 | Value Unlimited Indicator 181166 | 0..1 181168 |

Fig. 182a

| GDT | | Cat. | Obj. Class | Prop. | Rep./ Assn. | Type | Data Type | Lgth. | Card. | Remarks |
|---|---|---|---|---|---|---|---|---|---|---|
| Product Cat. ID 18200 | | | Product Cat. 18202 | Identification 18204 | Identifier 18206 | CCT 18208 | Identifier 18210 | 1..40 18212 | | Restricted 18214 |
| | scheme ID 18216 | A 18218 | Identification Scheme 18220 | Identification 18222 | Identifier 18228 | xsd 18230 | token 18232 | 1..60 18234 | 0..1 18236 | |
| | Scheme Version ID 18238 | A 18240 | Identification Scheme 18242 | Version 18244 | Identifier 18246 | xsd 18248 | token 18250 | 1..15 18252 | 0..1 18254 | |
| | scheme Agency ID 18256 | A 18258 | Identification Scheme Agency 18260 | Identification 18262 | Identifier 18264 | xsd 18266 | token 18268 | 1..60 18270 | 0..1 18272 | |

Fig. 182b

| GDT | | Cat. | Obj. Class | Prop. | Rep./ Assn. | Type | Data Type | Lgth. | Card. | Remarks |
|---|---|---|---|---|---|---|---|---|---|---|
| | scheme Agency Scheme ID 18274 | A 18276 | Identification Scheme Agency 18278 | Scheme 18280 | Identifier 18282 | xsd 18284 | token 18286 | 1..60 18288 | 0..1 18290 | |
| | scheme Agency Scheme Agency ID 18292 | A 18294 | Identification Scheme Agency 18296 | Scheme Agency 18298 | Identifier 18201 | xsd 18203 | token 18205 | 3 18207 | 0..1 18209 | |

Fig. 183

| CDT | | Cat. | Obj. Class | Prop. | Rep./ Assn. | Type | Type Name | Lgth. | Card. | Remarks |
|---|---|---|---|---|---|---|---|---|---|---|
| Product Cat. Internal ID 18300 | | | Product Cat. 18302 | Internal Identification 18304 | Identifier 18306 | GDT 18308 | Product Cat. ID 18310 | 1..40 18312 | | Restricted 18314 |
| | scheme ID 18316 | A 18318 | Identification Scheme 18320 | Identification 18322 | Identifier 18324 | xsd 18326 | token 18328 | 1..60 18330 | 0..1 18332 | |
| | scheme Agency ID 18334 | A 18336 | Identification Scheme Agency 18338 | Identification 18340 | Identifier 18342 | xsd 18344 | token 18346 | 1..60 18348 | 0..1 18350 | |

Fig. 184

| CDT | Obj. Class | Prop. Qual. | Prop. | Rep./ Assn. | Type | Type Name | Lgth. | Remarks |
|---|---|---|---|---|---|---|---|---|
| Product Cat. Party ID 18400 | Product Cat. 18402 | Party 18404 | Identification 18406 | Identifier 18408 | GDT 18410 | Product Cat. ID 18412 | 1..40 18414 | Restricted 18416 |

Fig. 185

| CDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Product Cat. Stan-dard ID 18500 | | | Product Cat. 18502 | Standard 18504 | Identification 18506 | Identifier 18508 | GDT 18510 | Product Cat. ID 18512 | 1..40 18514 | | Restricted 18516 |
| | scheme ID 18518 | A 18520 | Identification Scheme 18522 | | Identification 18524 | Identifier 18526 | xsd 18528 | token 18530 | 1..60 18532 | 0..1 18534 | |
| | Scheme Version ID 18536 | A 18538 | Identification Scheme 18540 | | Version 18542 | Identifier 18544 | xsd 18546 | token 18548 | 1..15 18550 | 0..1 18552 | |
| | scheme Agency ID 18554 | A 18556 | Identification Scheme Agency 18558 | | Identification 18560 | Identifier 18562 | xsd 18564 | token 18566 | 3 18568 | 1 18570 | |

Fig. 186

| GDT | Cat. | Obj. Class | Prop. | Rep./ Assn. | Type | Type Name | Lgth. | Remarks |
|---|---|---|---|---|---|---|---|---|
| Product Change ID 18600 | E 18602 | Product Change 18604 | Identification 18606 | Identifier 18608 | CCT 18610 | Identifier 18612 | 1..32 18614 | Restricted 18616 |

Fig. 187

| GDT | Obj. Class | Prop. | Rep./ Assn. | Type | Type Name | Lgth. | Remarks |
|---|---|---|---|---|---|---|---|
| Product Demand Influencing Event Status Code 18700 | Product Demand Influencing Event 18702 | Status 18704 | Code 18706 | CCT 18708 | Code 18710 | 1..35 18712 | Restricted 18714 |

Fig. 188

| GDT | Obj. Class | Prop. | Rep./ Assn. | Type | Type Name | Lgth. | Remarks |
|---|---|---|---|---|---|---|---|
| Product Demand Influencing Event Type Code 18800 | Product Demand Influencing Event 18802 | Type 18804 | Code 18806 | CCT 18808 | Code 18810 | 1..35 18812 | Restricted 18814 |

Fig. 189

| GDT | Obj. Class | Prop. | Rep./ Assn. | Type | Type Name |
|---|---|---|---|---|---|
| Product Discontinuation Indicator 18900 | Product 18902 | Discontinuation 18904 | Indicator 18906 | CCT 18908 | Indicator 18910 |

Fig. 190a

| GDT | | Cat. | Obj. Class | Prop. | Rep./ Assn. | Type | Type Name | Lgth. | Card. | Remarks |
|---|---|---|---|---|---|---|---|---|---|---|
| Product ID 19000 | | | Product 19002 | Identifi-cation 19004 | Identifier 19006 | CCT 19008 | Identifier 19010 | 1..60 19012 | | Restricted 19014 |
| | scheme ID 19016 | A 19018 | Identification Scheme 19020 | Identifi-cation 19022 | Identifier 19024 | xsd 19026 | token 19028 | 1..60 19030 | 0..1 19032 | |
| | scheme Agency ID 19034 | A 19036 | Identification Scheme Agency 19038 | Identifi-cation 19040 | Identifier 19042 | xsd 19044 | token 19046 | 1..60 19048 | 0..1 19050 | |

Fig. 190b

| GDT | | Cat. | Obj. Class | Prop. | Rep./ Assn. | Type | Type Name | Lgth. | Card. | Remarks |
|---|---|---|---|---|---|---|---|---|---|---|
| | scheme Agency Scheme ID 19052 | A 19054 | Identification Scheme Agency 19056 | Scheme 19058 | Identifier 19060 | xsd 19062 | token 19064 | 1..60 19066 | 0..1 19068 | |
| | scheme Agency Scheme Agency ID 19070 | A 19072 | Identification Scheme Agency 19074 | Scheme Agency 19076 | Identifier 19078 | xsd 19080 | token 19082 | 3 19084 | 0..1 19086 | |

Fig. 191

| CDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Product Internal ID 19100 | | | Product 19102 | Internal 19104 | Identification 19106 | Identifier 19108 | GDT 19110 | Product ID 19112 | 1..60 19114 | | Restricted 19116 |
| | scheme ID 19118 | A 19120 | Identification Scheme 19122 | | Identification 19124 | Identifier 19126 | xsd 19128 | token 19130 | 1..60 19132 | 0..1 19134 | |
| | scheme Agency ID 19136 | A 19138 | Identification Scheme Agency 19140 | | Identification 19140 | Identifier 19142 | xsd 19144 | token 19146 | 1..60 19148 | 0..1 19150 | |

Fig. 192

| CDT | Obj. Class | Prop. Qual. | Prop. | Rep./ Assn. | Type | Type Name | Lgth. | Remarks |
|---|---|---|---|---|---|---|---|---|
| Product Party ID 19200 | Product 19202 | Party 19204 | Identification 19206 | Identifier 19208 | GDT 19210 | Product ID 19212 | 1..60 19214 | Restricted 19216 |

Fig. 193

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Product Standard ID 19300 | | | Product 19302 | Standard 19304 | Identifi- cation 19306 | Identifier 19308 | GDT 19310 | Product ID 19312 | 1..14 19314 | | Restricted 19316 |
| | scheme ID 19318 | Attribute 19320 | Identification Scheme 19322 | | Identifi- cation 19324 | Identifier 19326 | xsd 19328 | token 19330 | 1..60 19332 | 0..1 19334 | |
| | scheme Agency ID 19336 | Attribute 19338 | Identification Scheme Agency 19340 | | Identifi- cation 19342 | Identifier 19344 | xsd 19346 | token 19348 | 3 19350 | 1 19352 | |

Fig. 194a

| GDT | | Cat. | Obj. Class | Prop. | Rep./ Assn. | Type | Type Name | Lgth. | Card. |
|---|---|---|---|---|---|---|---|---|---|
| Product Tax 19400 | | | Product Tax 19401 | | Details 19402 | | | | |
| | Country Code 19403 | Element 19404 | Product Tax 19405 | Country Code 19406 | Code 19407 | GDT 19408 | Country Code 19409 | | 0..1 19410 |
| | Jurisdiction Code 19411 | Element 19412 | Product Tax 19413 | Tax Jurisdiction Code 19414 | Code 19415 | GDT 19416 | Tax Jurisdiction Code 19417 | | 0..1 19418 |
| | Type Code 19419 | Element 19420 | Product Tax 19421 | Type Code 19422 | Code 19423 | GDT 19424 | Product Tax Type Code 19425 | | 0..1 19426 |
| | Type Description 19427 | Element 19428 | Product Tax 19429 | Type Description 19430 | Text 19431 | GDT 19432 | Description 19433 | | 0..1 19434 |
| | Base Amount 19435 | Element 19436 | Product Tax 19437 | Base Amount 19438 | Amount 19439 | GDT 19440 | Amount 19441 | | 0..1 19442 |

Fig. 194b

| GDT | | Cat. | Obj. Class | Prop. | Rep./ Assn. | Type | Type Name | Lgth. | Card. |
|---|---|---|---|---|---|---|---|---|---|
| | Percent 19443 | Element 19444 | Product Tax 19445 | Percent 19446 | Percent 19447 | GDT 19448 | Percent 19449 | | 0..1 19450 |
| | Amount 19451 | Element 19452 | Product Tax 19453 | Amount 19454 | Amount 19455 | GDT 19456 | Amount 19457 | | 0..1 19458 |
| | NonDeduc-tible Percent 19459 | Element 19460 | Product Tax 19461 | NonDeduc-tible Percent 19462 | Decimal 19463 | GDT 19464 | Percent 19465 | | 0..1 19466 |
| | Non Deductible Amount 19467 | Element 19468 | Product Tax 19469 | NonDeduc-tible Amount 19470 | Amount 19471 | GDT 19472 | Amount 19473 | | 0..1 19474 |
| | Business Transaction Document Item Group ID 19475 | Element 19476 | Product Tax 19477 | Business Transaction Document Item Group Identification 19478 | Identifier 19479 | GDT 19480 | Business Transaction Document Item Group ID 19481 | | 0..1 19482 |

Fig. 194c

| GDT | | Cat. | Obj. Class | Prop. | Rep./ Assn. | Type | Type Name | Lgth. | Card. |
|---|---|---|---|---|---|---|---|---|---|
| | Triangu-lation Indicator 19483 | Element 19484 | Product Tax 19485 | Triangu-lation 19486 | Indicator 19487 | CCT 19488 | Indicator 19489 | | 0..1 19490 |
| | Legally Required Phrase 19491 | Element 19492 | Product Tax 19493 | Legally Required Phrase 19494 | Text 19495 | CCT 19496 | Text 19497 | 1..256 19498 | 0..1 19499 |

Fig. 195

| GDT | Obj. Class | Prop. | Rep./ Assn. | Type | Type Name | Lgth. | Remarks |
|---|---|---|---|---|---|---|---|
| Product Tax Event Type Code 19500 | Product Tax Event 19502 | Type Code 19504 | Code 19506 | CCT 19508 | Code 19510 | 3..6 19512 | Restricted 19514 |

Fig. 196

| GDT | Obj. Class | Prop. | Rep./ Assn. | Type | Type Name | Lgth. | Remarks |
|---|---|---|---|---|---|---|---|
| Product Tax Type Code 19600 | Product tax Type 19602 | Code 19604 | Code 19606 | CCT 19608 | Code 19610 | 3 19612 | Restricted 19614 |

Fig. 197

| GDT | Cat. | Obj. Class | Prop. | Rep./ Assn. | Type | Type Name | Lgth. | Remarks |
|---|---|---|---|---|---|---|---|---|
| Product Type Code 19700 | Element 19702 | Product 19704 | Type 19706 | Code 19708 | CCT 19710 | Code 19712 | 1..2 19714 | Restricted 19716 |

Fig. 198

| GDT | Obj. Class | Prop. | Rep./ Assn. | Type | Type Name | Lgth. | Remarks |
|---|---|---|---|---|---|---|---|
| Promotion ID 19800 | Promotion 19802 | Identification 19804 | Identifier 19806 | CCT 19808 | Identifier 19810 | 1..35 19812 | Restricted 19814 |

Fig. 199a

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| Prop. 19900 | | | | | | Details 19901 | | | | | |
| | Action Code 19902 | Attribute 19903 | Prop. 19904 | | Action 19905 | Code 19906 | GDT 19907 | Action-Code 19908 | | 0..1 19909 | |
| | ID 19910 | Element 19911 | Prop. 19912 | | Iden-tification 19913 | Prop.ID 19914 | GDT 19915 | Prop.ID 19916 | | 1 19917 | |
| | Version ID 19918 | Element 19919 | Prop. 19920 | | Version Iden-tification 19921 | Version ID 19922 | GDT 19923 | Version ID 19924 | | 0..1 19925 | |
| | Definition Class Re-ference 19926 | Element 19927 | Prop. 19928 | | Definition Class Reference 19929 | Prop. Definition Class Refer-ence 19930 | GDT 19931 | Prop.Def-inition Class Ref-erence 19932 | | 0..1 19933 | |
| | Revision ID 19934 | Element 19935 | Prop. 19936 | | Revision identifi-cation 19937 | Identifier 19938 | CCT 19939 | Identifier 19940 | 1..10 19941 | 0..1 19942 | Restrict-ed 19943 |

Fig. 199b

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| | Version Date Time 19952 | Element 19953 | Prop. 19954 | | Version 19955 | Date Time 19956 | GDT 19957 | Date Time 19958 | | 0..1 19959 | |
| | Revision Date Time 19960 | Element 19961 | Prop. 19962 | | Revisio n 19963 | Date Time 19964 | GDT 19965 | Date Time 19966 | | 0..1 19967 | |
| | Subject Area Code 19968 | Element 19969 | Prop. 19970 | | Subject Area 19971 | Code 19972 | GDT 19973 | Subject Area Code 19974 | | 0..n 19975 | |
| | Preferred Name 19976 | Element 19977 | Prop. 19978 | Preferred 19979 | Name 19980 | Name 19981 | GDT 19982 | Name 19983 | | 1..n 19984 | |
| | Syno- nymous Name 19985 | Element 19986 | Prop. 19987 | Synony- mous 19988 | Name 19989 | Name 19990 | GDT 19991 | Name 19992 | | 0..n 19993 | |
| | Abbre- viation Name 19994 | Element 19995 | Prop. 19996 | Abbrevia- tion 19997 | Name 19998 | Name 19999 | GDT 19901a | Name 19902a | | 0..n 19903a | |

Fig. 199c

| GDT | Cat. | Obj. Class | Prop. Qual. | Prop. | Rep./ Assn. | Type | Type Name | Lgth. | Card. | Remarks |
|---|---|---|---|---|---|---|---|---|---|---|
| Defining Des-cription 19904a | Element 19905a | Prop. 19906a | Defining 19907a | Descrip-tion 19908a | Des-cription 19909a | GDT 19910a | Descrip-tion 19911a | | 0..n 19912a | |
| Addi-tional Des-cription 19913a | Element 19914a | Prop. 19915a | Additional 19916a | Des-cription 19917a | Des-cription 19918a | GDT 19919a | Descrip-tion 19920a | | 0..n 19921a | |
| Usage Des-cription 19922a | Element 19923a | Prop. 19924a | Usage 19925a | Descrip-tion 19926a | Des-cription 19927a | GDT 19928a | Descrip-tion 19929a | | 0..n 19930a | |
| Preferred Symbol Note 19931a | Element 19932a | Prop. 19933a | Preferred 19934a | Symbol 19935a | Note 19936a | GDT 19937a | Note 19938a | | 0..1 19939a | |
| Synonym ous Symbol Note 19940a | Element 19941a | Prop. 19942a | Syno-nymal 19943a | Symbol 19944a | Note 19945a | GDT 19946a | Note 19947a | | 0..n 19948a | |

Fig. 199d

| GDT | Cat. | Obj. Class | Prop. Qual. | Prop. | Rep./ Assn. | Type | Type Name | Lgth. | Card. | Remarks |
|---|---|---|---|---|---|---|---|---|---|---|
| Definition Source Docu- ment Web Address 19949a | Element 19950a | Prop. 19951a | Definition Source 19952a | Docu- ment 19953a | Web Address 19954a | GDT 19955a | Web Address 19956a | | 0..1 19957a | |
| Icon Attach- ment 19958a | Element 19959a | Prop. 19960a | | Icon 19961a | Attach- ment 19962a | GDT 19963a | Attach- ment 19964a | | 0..1 19965a | |
| Figure Attach- ment 19966a | Element 19967a | Prop. 19968a | | Figure 19969a | Attach- ment 19970a | GDT 19971a | Attach- ment 19972a | | 0..1 19973a | |
| Prop. Data Type 19974a | Element 19975a | Prop. 19976a | | Prop. Data Type 19977a | Prop. Data Type 19978a | GDT 19979a | Prop. Data Type 19980a | | 0..1 19981a | |
| Prop. Data Type Refer- ence 19982a | Element 19983a | Prop. 19984a | | Prop. Data Type Refer- ence 19985a | Prop. Data Type Refer- ence 19986a | GDT 19987a | Prop. Data Type Refer- ence 19988a | | 0..1 19989a | |

Fig. 199e

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| | Measure Unit Meaning Code 19990a | Element 19991a | Prop. 19992a | | Measure Unit Meaning 19993a | Code 19994a | GDT 19995a | Measure Unit Meaning Code 19996a | | 0..1 19997a | |
| | Depend-ing Prop. Refer-ence 19998a | Element 19999a | Prop. 19901b | Depend-ing 19902b | Prop. Iden-tification 19903b | Prop Iden-tification 19904b | GDT 19905b | Prop. Refer-ence 19906b | | 0..n 19907b | |
| | Con-straining Prop. Refer-ence 19908b | Element 19909b | Prop. 19910b | Con-straining 19911b | Prop. Iden-tification 19912b | Prop. Iden-tification 19913b | GDT 19914b | Prop. Reference 19915b | | 0..n 19916b | |
| | Aspect ID 19917b | Element 19918b | Prop. 19919b | | Aspect Iden-tification 19920b | Identifier 19921b | GDT 19922b | Aspect ID 19923b | | 0..n 19924b | only for catalogue 19925b |

Fig. 199f

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| | Target Interface Element ID 19926b | Element 19927b | Prop. 19928b | | Target Interface Element Iden-tification 19929b | Identifier 19930b | GDT 19931b | Interface Element ID 19932b | | 0..n 19933b | only for catalogue 19934b |
| | Multiple Value Indicator 19935b | Element 19936b | Prop. 19937b | | Multiple Value Indication 19938b | Indicator 19939b | GDT 19940b | Prop. Multiple Value Indicator 19941b | | 0..1 19942b | only for catalogue 19943b |
| | Text Search-able Indicator 19944b | Element 19946b | Prop. 19947b | | Text Search-able Indication 19948b | Indicator 19949b | GDT 19950b | Text Search-able Indicator 19951b | | 0..1 19952b | only for catalogue 19953b |
| | Para-metric Search-able Indicator 19954b | Element 19955b | Prop. 19956b | | Para-metric Search-able Indication 19957b | Indicator 19958b | GDT 19959b | Prop. Para-metric Search-able Indicator 19960b | | 0..1 19961b | only for catalogue 19962b |

Fig. 199g

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| | Valuation Required Indicator 19963b | Element 19964b | Prop. 19965b | | Valuation Required Indication 19966b | Indicator 19967b | GDT 19968b | Prop. Valuation Required Indicator 19969b | | 0..1 19970b | only for catalogue 19971b |

Fig. 200a

| CDT | | | Cat. | Obj. Class | Prop. Qual. | Prop. | Rep./ Assn. Qual. | Rep./ Assn. | Type | Type Name | Lgth. | Card. |
|---|---|---|---|---|---|---|---|---|---|---|---|---|
| Prop. Data Type 20000 | | | | | | | | Details 20001 | | | | |
| | Action Code 20002 | | Attribute 20003 | Prop. Data Type 20004 | | Action 20005 | | Code 20006 | GDT 20007 | Action Code 20008 | | 0..1 20009 |
| | ID 20010 | | Element 20011 | Prop. Data Type 20012 | | Identification 20013 | | Identifier 20014 | GDT 20015 | Prop. Data Type ID 20016 | | 0..1 20017 |
| | Version ID 20018 | | Element 20019 | Prop. Data Type 20020 | | Version Identification 20021 | | Version ID 20022 | GDT 20023 | Version ID 20024 | | 0..1 20025 |
| | Preferred Name 20026 | | Element 20027 | Prop. Data Type 20028 | Preferred 20029 | Name 20030 | | Name 20031 | GDT 20032 | Name 20033 | | 1..n 20034 |
| | Synonymous Name 20035 | | Element 20036 | Prop. Data Type 20037 | Synonymous 20038 | Name 20039 | | Name 20040 | GDT 20041 | Name 20042 | | 0..n 20043 |

Fig. 200b

| CDT | | | Cat. | Obj. Class | Prop. Qual. | Prop. | Rep./ Assn. Qual. | Rep./ Assn. | Type | Type Name | Lgth. | Card. |
|---|---|---|---|---|---|---|---|---|---|---|---|---|
| | Short Name 20044 | | Element 20045 | Prop. Data Type 20046 | Short 20047 | Name 20048 | | Name 20049 | GDT 20050 | Name 20051 | | 0..n 20052 |
| | Icon Attach-ment 20053 | | Element 20054 | Prop. Data Type 20055 | | Icon 20056 | | Attach-ment 20057 | GDT 20058 | Attachm ent 20059 | | 0..1 20060 |
| | Des-cription 20061 | | Element 20062 | Prop. Data Type 20063 | | Des-cription 20064 | | Des-cription 20065 | GDT 20066 | Descrip-tion 20067 | | 0..n 20068 |
| | Usage Des-cription 20069 | | Element 20070 | Prop. Data Type 20071 | Usage 20072 | Des-cription 20073 | | Des-cription 20074 | GDT 20075 | Descrip-tion 20076 | | 0..n 20077 |
| | Format Code 20078 | | Element 20079 | Prop. Data Type 20080 | | Format 20081 | | Code 20082 | GDT 20083 | Prop. Data Type Format Code 20084 | | 1..1 20085 |

Fig. 200c

| CDT | | Cat. | Obj. Class | Prop. Qual. | Prop. | Rep./ Assn. Qual. | Rep./ Assn. | Type | Type Name | Lgth. | Card. |
|---|---|---|---|---|---|---|---|---|---|---|---|
| | Lan-guage Depen-dency Indicator 20086 | Element 20087 | Prop. Data Type 20087 | | Lan-guage Depen-dency 20089 | | Indicator 20090 | GDT 20091 | Language Dependency Indicator 20092 | | 0..1 20093 |
| | Maxi-mum Total Digit Number Value 20094 | Element 20095 | Prop. Data Type 20096 | Maximum Total 20097 | Digit Number 20098 | Digit Number 20099 | Value 20001a | GDT 20002a | Digit Number Value 20003a | | 0..1 20004a |
| | Lower Case Allowed Indicator 20015a | Element 20016a | Prop. Data Type 20017a | | Lower Case Allowed 20018a | | Indicator 20019a | GDT 20020a | Indicator 20021a | | 0..1 20022a |
| | Negative Value Allowed Indicator 20023a | Element 20024a | Prop. Data Type 20025a | | Negative Value Allowed 20026a | | Indicator 20027a | GDT 20028a | Indicator 20029a | | 0..1 20030a |

Fig. 200d

| CDT | | Cat. | Obj. Class | Prop. Qual. | Prop. | Rep./Assn. Qual. | Rep./ Assn. | Type | Type Name | Lgth. | Card. |
|---|---|---|---|---|---|---|---|---|---|---|---|
| | Measure Unit Code 20031a | Element 20032a | Prop. Data Type 20033a | | Measure Unit 20034a | | Code 20035a | GDT 20036a | Measure Unit Code 20037a | | 0..1 20038a |
| | Currency Code 20039a | Element 20040a | Prop. Data Type 20041a | | Currency 20042a | | Code 20043a | GDT 20044a | Currency Code 20045a | | 0..1 20046a |
| | Expo-nential Rep. Type Code 20047a | Element 20048a | Prop. Data Type 20049a | | Exponential Rep. Type 20050a | | Code 20051a | GDT 20052a | Exponen-tial Rep. Type Code 20053a | | 0..1 20054a |
| | Expo-nent Integer Value 20055a | Element 20056a | Prop. Data Type 20057a | | Expo-nent 20058a | Integer 20059a | Value 20060a | GDT 20061a | Integer Value 20062a | | 0..1 20063a |
| | Interval Value Allowed Indicator 20064a | Element 20065a | Prop. Data Type 20066a | Interval 20067a | Value Allowed 20068a | | Indicator 20069a | GDT 20070a | Indicator 20071a | | 0..1 20072a |

Fig. 200e

| CDT | | | Cat. | Obj. Class | Prop. Qual. | Prop. | Rep./ Assn. Qual. | Rep./ Assn. | Type | Type Name | Lgth. | Card. |
|---|---|---|---|---|---|---|---|---|---|---|---|---|
| | Frac-tional Digit Present-ation Accu-racy Indicator 20073a | | Element 20074a | Prop. Data Type 20075a | Frac-tional Digit 20076a | Present-ation Accu-racy 20077a | | Indicator 20078a | GDT 20079a | Indicator 20080a | | 0..1 20081a |
| | Regular Expres-sion 20082a | | Element 20083a | Prop. Data Type 20084a | | Regular Expres-sion 20085a | | Text 20086a | GDT 20087a | Note 20088a | | 0..1 20089a |
| | Separa-tor Usage Indicator 20090a | | Element 20091a | Prop. Data Type 20092a | | Sepa-rator Usage 20093a | | Indicator 20094a | GDT 20095a | Indicator 20096a | | 0..1 20097a |
| | Tupel Lgth. Value 20098a | | Element 20099a | Prop. Data Type 20001b | | Tupel Lgth 20002b | Tupel Lgth. 20003b | Value 20004b | GDT 20005b | Tupel Lgth. Value 20006b | | 0..1 20007b |

Fig. 200f

| CDT | | | Cat. | Obj. Class | Prop. Qual. | Prop. | Rep./ Assn. Qual. | Rep./ Assn. | Type | Type Name | Lgth. | Card. |
|---|---|---|---|---|---|---|---|---|---|---|---|---|
| | Component Prop. Definition Class Reference 20008b | | Element 20009b | Prop. Data Type 20010b | Component 20011b | Prop. Definition Class Reference 20012b | | Prop. Definition Class Reference 20013b | GDT 20014b | Prop. Definition Class Reference 20015b | | 0..1 20016b |
| | Component Prop. 20017b | | Element 20018b | Prop. Data Type 20019b | Component 20020b | Prop. Reference 20021b | | Prop. Reference 20022b | GDT 20023b | Prop. Reference 20024b | | 0..n 20025b |
| | | Reference 20026b | Element 20027b | Component Prop. 20028b | | Prop. Reference 20029b | | Prop. Reference 20030b | GDT 20031b | Prop. Reference 20032b | | 1 20033b |
| | | Ordinal Number Value 20034b | Element 20035b | Component Prop. 20036b | | Ordinal Number 20037b | | Value 20038b | GDT 20039b | Ordinal Number Value 20040b | | 0..1 20041b |

Fig. 200g

| CDT | | | Cat. | Obj. Class | Prop. Qual. | Prop. | Rep./ Assn. Qual. | Rep./ Assn. | Type | Type Name | Lgth. | Card. |
|---|---|---|---|---|---|---|---|---|---|---|---|---|
| | Allowed Prop. Value Element 20042b | | Element 20043b | Prop. Data Type 20044b | Allowed 20045b | Prop. Value Structure 20046b | | Details 20047b | | | | 0..n 20048b |
| | | Prop. Value 20049b | Element 20050b | Prop. Value Structure 20051b | | Prop. Value 20052b | | Prop. Value 20053b | GDT 20054b | Prop. Value 20055b | | 1 20056b |
| | | Default Value Indicator 20057b | Element 20058b | Prop. Value Structure 20059b | | Default Value 20060b | | Indicator 20061b | GDT 20062b | Indicator 20063b | | 0..1 20064b |
| | | Net Element ID 20065b | Element 20066b | Prop. Value Structure 20067b | | Net Element Identifi-cation 20068b | | Identifier 20069b | CCT 20070b | Identifier 20071b | 5 20072b | 0..1 20073b |

Fig. 200h

| CDT | | | Cat. | Obj. Class | Prop. Qual. | Prop. | Rep./ Assn. Qual. | Rep./ Assn. | Type | Type Name | Lgth. | Card. |
|---|---|---|---|---|---|---|---|---|---|---|---|---|
| | | Preced-ing Net Element ID 20074b | Element 20075b | Prop. Value Structure 20076b | Preced-ing 20077b | Netel-ment Ideniti-fication 20078b | | Identi-fier 20079b | CCT 20080b | Identifier 20081b | 5 20082b | 0..n 20083b |
| | Allowed Prop. Valua-tion 20084b | | Element 20085b | Prop. Data Type 20086b | Allowed 20087b | Prop. Valua-tion 20088b | | Prop. Valua-tion 20089b | GDT 20090b | Prop. Valua-tion 20091b | | 0..n 20092b |

Fig. 201

| GDT | Obj. Class | Prop. | Rep./ Assn. | Type | Type Name | Lgth. | Remarks |
|---|---|---|---|---|---|---|---|
| Prop. Data Type Format Code 20100 | Prop. Data Type 20102 | Format 20104 | Code 20106 | CCT 20108 | Code 20110 | 10 20112 | Restricted 20114 |

Fig. 202

| GDT | | Cat. | Obj. Class | Prop. | Rep./ Assn. | Type | Type Name | Lgth. | Card. | Remarks |
|---|---|---|---|---|---|---|---|---|---|---|
| Prop. Data Type ID 20200 | | | Prop. Data Type 20202 | Identifica-tion 20204 | Identifier 20206 | CCT 20208 | Identifier 20210 | 1..50 20212 | | Restricted 20214 |
| | Scheme Agency ID 20216 | Attribute 20218 | Identification Scheme-Agency 20220 | Identifica-tion 20222 | Identifier 20224 | xsd 20226 | token 20228 | 1..60 20230 | 1 20232 | |
| | Scheme Agency Scheme ID 20234 | Attribute 20236 | Identification Scheme-Agency 20238 | Scheme 20240 | Identifier 20242 | xsd 20244 | token 20246 | 1..60 20248 | 0..1 20250 | |
| | Scheme Agency Scheme Agency ID 20252 | Attribute 20254 | Identification Scheme-Agency 20256 | Scheme Agency 20258 | Identifier 20260 | xsd 20262 | token 20264 | 3 20266 | 0..1 20268 | |

Fig. 203

| GDT | | Cat. | Obj. Class | Prop. | Rep./ Assn. | Type | Type Name | Card. |
|---|---|---|---|---|---|---|---|---|
| Prop. Data Type Reference 20300 | | | Prop. Data Type Reference 20302 | | Details 20304 | | | |
| | ID 20306 | Element 20308 | Prop. Data Type Reference 20310 | Identification 20312 | Identifier 20314 | GDT 20316 | Prop. Data Type ID 20318 | 1 |
| | Version ID 20320 | Element 20322 | Prop. Data Type Reference 20324 | Version Identification 20326 | Identifier 20328 | GDT 20330 | Version ID 20332 | 0..1 20334 |

Fig. 204a

| GDT | | | Cat. | Obj. Class | Prop. Qual. | Prop. | Rep./ Assn. | Type | Type Name | Lgth. | Card. | Remarks |
|---|---|---|---|---|---|---|---|---|---|---|---|---|
| Prop. Definition Class 20400 | | | | | | | Details 20401 | | | | | |
| | Action Code 20402 | | Attribute 20403 | Prop. Definition Class 20404 | | Action 20405 | Code 20406 | GDT 20407 | Action Code 20408 | | 0..1 20409 | |
| | ID 20410 | | Element 20411 | Prop. Definition Class 20412 | | Identifi- cation 20413 | Prop. Definition Class ID 20414 | GDT 20415 | Prop. Definition Class ID 20416 | | 1..1 20417 | |
| | Version ID 20418 | | Element 20419 | Prop. Definition Class 20420 | | Version Identifi- cation 20421 | Version ID 20422 | GDT 20423 | Version ID 20424 | | 0..1 20425 | |
| | Revision ID 20426 | | Element 20427 | Prop. Definition Class 20428 | | Revision Identifi- cation 20429 | Identifier 20430 | CCT 20431 | Identifier 20432 | 1..10 20433 | 0..1 20434 | Restricted 20435 |
| | Creation Date Time 20436 | | Element 20437 | Prop. Definition Class 20438 | | Creation Date Time 20439 | Date Time 20440 | GDT 20441 | Date Time 20442 | | 0..1 20443 | |

Fig. 204b

| GDT | | | Cat. | Obj. Class | Prop. Qual. | Prop. | Rep./ Assn. | Type | Type Name | Lgth. | Card. | Remarks |
|---|---|---|---|---|---|---|---|---|---|---|---|---|
| | Version Date Time 20444 | | Ele-ment 20445 | Prop. Definition Class 20446 | | Version Date Time 20447 | Date Time 20448 | GDT 20449 | Date Time 20450 | | 0..1 20451 | |
| | Revision Date Time 20452 | | Ele-ment 20453 | Prop. Definition Class 20454 | | Revision Date Time 20455 | Date Time 20456 | GDT 20457 | Date Time 20458 | | 0..1 20459 | |
| | Preferred Name 20460 | | Ele-ment 20461 | Prop. Definition Class 20462 | Pre-ferred 20463 | Name 20464 | Name 20465 | GDT 20466 | Name 20467 | | 1..n 20468 | |
| | Synony-mous Name 20469 | | Ele-ment 20470 | Prop. Definition Class 20471 | Synony-mous 20472 | Name 20473 | Name 20474 | GDT 20475 | Name 20476 | | 0..n 20477 | |
| | Short Name 20478 | | Ele-ment 20479 | Prop. Definition Class 20480 | Short 20481 | Name 20482 | Name 20483 | GDT 20484 | Name 20485 | | 0..n 20486 | |

Fig. 204c

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| | Icon Attach-ment 20487 | Ele-ment 20488 | Prop. Definition Class 20489 | Icon 20490 | Attach-ment 20491 | Attach-ment 20492 | GDT 20493 | Attach-ment 20494 | | 0..1 20495 | |
| | Defining Des-cription 20496 | Ele-ment 20497 | Prop. Definition Class 20498 | Defining 20499 | Des-cription 20401a | Des-cription 20402a | GDT 20403a | Des-cription 20404a | | 0..n 20405a | |
| | Source Docu-ment Web Address 20406a | Ele-ment 20407a | Prop. Definition Class 20408a | Source 20409a | Docu-ment 20410a | Web Address 20411a | CCT 20412a | Web Address 20413a | | 0..1 20414a | |
| | Additional Descrip-tion 20415a | Element 20416a | Prop. Definition Class 20417a | Addi-tional 20418a | Des-cription 20419a | Des-cription 20420a | GDT 20421a | Des-cription 20422a | | 0..n 20423a | |
| | Usage Descrip-tion 20424a | Element 20425a | Prop. Definition Class 20426a | Usage 20427a | Des-cription 20428a | Des-cription 20429a | GDT 20430a | Des-cription 20431a | | 0..n 20432a | |

Fig. 204d

| GDT | | Cat. | Obj. Class | Prop. Qual. | Prop. | Rep./ Assn. | Type | Type Name | Lgth. | Card. | Remarks |
|---|---|---|---|---|---|---|---|---|---|---|---|
| | Type Code 20433a | Element 20434a | Prop. Definition Class 20435a | | Type 20436a | Code 20437a | GDT 20438a | Prop. Definition Class Type Code 20439a | | 0..1 20440a | |
| | Simplified Graphic Attach-ment 20441a | Ele-ment 20442a | Prop. Definition Class 20443a | Simp-lified Graphic 20444a | Attach-ment 20445a | Attachment 20446a | GDT 20447a | Attach-ment 20448a | | 0..1 20449a | |
| | Subject Area Code 20450a | Ele-ment 20451a | Prop. Definition Class 20452a | Topic 20453a | Subject Area 20454a | Code 20455a | GDT 20456a | Subject Area Code 20457a | | 0..n 20458a | |
| | Parent Prop. Definition Class Refer-ence 20459a | Ele-ment 20460a | Prop. Definition Class 20461a | Parent 20462a | Definition Class Reference 20463a | Prop. Definition Class Reference 20464a | GDT 20465a | Prop. Definition Class Refer-ence 20466a | | 0..1 20467a | |
| | Defined Prop. 20468a | Ele-ment 20469a | Prop. Definition Class 20470a | | Defined Prop. 20471a | Details 20472a | | | | 0..n 20473a | |

Fig. 204e

| GDT | | | Cat. | Obj. Class | Prop. Qual. | Prop. | Rep./ Assn. | Type | Type Name | Lgth. | Card. | Remarks |
|---|---|---|---|---|---|---|---|---|---|---|---|---|
| | | Refer-ence 20474a | Element 20475a | Defined Prop. 20476a | | Reference 20477a | Prop. Reference 20478a | GDT 20479a | Prop. Refer-ence 20480a | | 1..1 20481a | |
| | | Ordinal Number Value 20482a | Element 20483a | Defined Prop. 20484a | | Ordinal Number 20485a | Value 20486a | GDT 20487a | Ordinal Number Value 20488a | | 0..1 20489a | |
| | | Sub-Hierarchy Definition Indicator 20490a | Element 20491a | Defined Prop. 20492a | | Sub-Hier-archy 20493a | Definition 20494a | CCT 20495a | Indicator 20496a | | 0..1 20497a | |
| | | Visibility Indicator 20498a | Element 20499a | Defined Prop. 20401b | | Visibility 20402b | Indicator 20403b | CCT 20404b | Indicator 20405b | | 0..1 20406b | |

Fig. 204f

| GDT | | | Cat. | Obj. Class | Prop. Qual. | Prop. | Rep./ Assn. | Type | Type Name | Lgth. | Card. | Remarks |
|---|---|---|---|---|---|---|---|---|---|---|---|---|
| | Hierarchy Prop. Valuation 20407b | | Element 20408b | Prop. Definition Class 20409b | Hier-archy 20410b | Prop. Valuation 20411b | Prop. Valuation 20412b | GDT 20413b | Prop. Valuation 20414b | | 0..n 20415b | |

Fig. 205

| GDT | | Cat. | Obj. Class | Prop. | Rep./ Assn. | Type | Type Name | Lgth. | Card. | Remarks |
|---|---|---|---|---|---|---|---|---|---|---|
| Prop. Definition Class ID 20500 | | | Prop. Definition Class 20502 | Identifi-cation 20504 | Identifier 20506 | CCT 20508 | Identifier 20510 | 1..50 20512 | | Restricted 20514 |
| | Scheme Agency ID 20516 | Attribute 20518 | Identifi-cation Scheme Agency 20520 | Identifi-cation 20522 | Identifier 20524 | xsd 20526 | token 20528 | 1..60 20530 | 1 | |
| | Scheme Agency Scheme ID 20532 | Attribute 20534 | Identifi-cation Scheme Agency 20536 | Scheme 20538 | Identifier 20540 | xsd 20542 | token 20544 | 1..60 20546 | 0..1 20548 | |
| | Scheme Agency Scheme Agency ID 20550 | Attribute 20552 | Identifi-cation Scheme Agency 20554 | Scheme Agency 20556 | Identifier 20558 | xsd 20560 | token 20562 | 3 20564 | 0..1 20566 | |

Fig. 206

| GDT | | Cat. | Obj. Class | Prop. | Rep./ Assn. | Type | Type Name | Card. |
|---|---|---|---|---|---|---|---|---|
| Prop. Definition Class Reference 20600 | | | Prop. Definition Class Reference 20602 | | Details 20604 | | | |
| | ID 20606 | Element 20608 | Prop. Definition Class Reference 20610 | Identification 20612 | Identifier 20614 | GDT 20616 | Prop. Definition Class ID 20618 | 1 20620 |
| | Version ID 20622 | Element 20624 | Prop. Definition Class Reference 20626 | Version Identification 20628 | Identifier 20630 | GDT 20632 | Version ID 20634 | 0..1 20636 |

Fig. 207

| GDT | Obj. Class | Rep./ Assn. | Type | Type Name | Lgth. | Remarks |
|---|---|---|---|---|---|---|
| Definition Class Type Code 20700 | Definition Class Type 20702 | Code 20704 | CCT 20706 | Code 20708 | 1 20710 | Restricted 20712 |

Fig. 208

| GDT | | Cat. | Obj. Class | Prop. | Rep./ Assn. | Type | Type Name | Lgth. | Card. | Remarks |
|---|---|---|---|---|---|---|---|---|---|---|
| Prop. ID 20800 | | | Prop. 20802 | Identifi-cation 20804 | Identifier 20806 | CCT 20808 | Identifier 20810 | 1..50 20812 | | Restricted 20814 |
| | Scheme Agency ID 20816 | Attribute 20818 | Identifi-cation Scheme-Agency 20820 | Identifi-cation 20822 | Identifier 20824 | xsd 20826 | token 20828 | 1..60 20830 | 1..1 20832 | |
| | Scheme Agency Scheme ID 20834 | Attribute 20836 | Identifi-cation Scheme-Agency 20838 | Scheme 20840 | Identifier 20842 | xsd 20844 | token 20846 | 1..60 20848 | 0..1 20850 | |
| | Scheme Agency Scheme Agency ID 20852 | Attribute 20854 | Identifi-cation Scheme-Agency 20856 | Scheme Agency 20858 | Identifier 20860 | xsd 20862 | token 20864 | 3 20866 | 0..1 20868 | |

Fig. 209

| GDT | Obj. Class | Prop. | Rep./ Assn. | Type Name |
|---|---|---|---|---|
| Prop. Multiple Value Indicator 20900 | Prop. 20902 | Multiple Value 20904 | Indicator 20906 | Indicator 20908 |

Fig. 210

| GDT | Obj. Class | Prop. | Rep./ Assn. | Type | Type Name |
|---|---|---|---|---|---|
| Prop. Parametric Searchable Indicator 21000 | Prop. 21002 | Parametric Searchable 21004 | Indicator 21006 | CCT 21008 | Indicator 21010 |

Fig. 211

| GDT | | Cat. | Obj. Class | Prop. | Rep./ Assn. | Type | Type Name | Card. |
|---|---|---|---|---|---|---|---|---|
| Prop. Reference 21100 | | | Prop. Reference 21102 | | Details 21104 | | | |
| | ID 21106 | Element 21108 | Prop. Reference 21110 | Identification 21112 | Identifier 21114 | GDT 21116 | Prop. ID 21118 | 1..1 21120 |
| | Version ID 21122 | Element 21124 | Prop. Reference 21126 | Version Identification 21128 | Version ID 21130 | GDT 21132 | Version ID 21134 | 0..1 21136 |
| | Definition Class Reference 21138 | Element 21140 | Prop. Reference 21142 | Definition Class Reference 21144 | Definition Class Reference 21146 | GDT 21148 | Definition Class Reference 21150 | 0..1 21152 |

Fig. 212a

| GDT | | Cat. | Obj. Class | Prop. | Rep./ Assn. | Type | Type Name | Lgth. | Card. |
|---|---|---|---|---|---|---|---|---|---|
| Prop. Valuation 21200 | | | Prop. Valuation 21202 | | Details 21204 | | | | |
| | Action Code 21206 | Attribute 21208 | Prop. Valuation 21210 | Action 21212 | Code 21214 | GDT 21216 | Action Code 21218 | | 0..1 21220 |
| | ID 21222 | Element 21224 | Prop. Valuation 21226 | Identifi-cation 21228 | Identifier 21230 | CCT 21232 | Identifier 21234 | 1..10 21236 | 0..1 21238 |

Fig. 212b

| GDT | | Cat. | Obj. Class | Prop. | Rep./ Assn. | Type | Type Name | Lgth. | Card. |
|---|---|---|---|---|---|---|---|---|---|
| | Parent ID 21240 | Element 21242 | Prop. Valuation 21244 | Parent Identifi-cation 21246 | Identifier 21248 | CCT 21250 | Identifier 21252 | 1..10 21254 | 0..1 21256 |
| | Prop. Refer-ence 21258 | Element 21260 | Prop. Valuation 21262 | Prop. Reference 21264 | Reference 21266 | GDT 21268 | Prop. Reference 21270 | | 1 21272 |
| | Prop. Value 21274 | Element 21276 | Prop. Valuation 21278 | Prop. Value 21280 | Prop. Value 21282 | GDT 21284 | Prop. Value 21286 | | 0..n 21288 |

Fig. 213

| GDT | Obj. Class | Prop. | Rep./ Assn. | Type | Type Name |
|---|---|---|---|---|---|
| Prop. Valuation Required Indicator 21300 | Prop. 21302 | Valuation Required 21304 | Indicator 21306 | CCT 21308 | Indicator 21310 |

Fig. 214a

| GDT | | | Cat. | Obj. Class | Prop. Qual. | Prop. | Rep./ Assn. Qual. | Rep./ Assn. | Type | Type Name | Card. |
|---|---|---|---|---|---|---|---|---|---|---|---|
| Prop. Value 21400 | | | Element 21401 | Prop. Value 21402 | | | | Details 21403 | | | |
| | Amount Specification 21404 | | Element 21405 | Prop. Value 21406 | | Amount Specification 21407 | | Details 21408 | | | 0..1 21409 |
| | | Amount 21410 | Element 21411 | Amount Specification 21412 | | Amount 21413 | | Amount 21414 | GDT 21415 | Amount 21416 | 0..1 21417 |
| | | Lower Amount 21418 | Element 21419 | Amount Specification 21420 | Lower 21421 | Amount 21422 | | Amount 21423 | GDT 21424 | Amount 21425 | 0..1 21426 |
| | | Upper Amount 21427 | Element 21428 | Amount Specification 21429 | Upper 21430 | Amount 21431 | | Amount 21432 | GDT 21433 | Amount 21434 | 0..1 21435 |
| | Quantity Specification 21436 | | Element 21437 | Prop. Value 21438 | | Quantity Specification 21439 | | Details 21440 | | | 0..1 21441 |

Fig. 214b

| GDT | | | Cat. | Obj. Class | Prop. Qual. | Prop. | Rep./ Assn. Qual. | Rep./ Assn. | Type | Type Name | Card. |
|---|---|---|---|---|---|---|---|---|---|---|---|
| | | Quantity 21442 | Element 21443 | Quantity Specification 21444 | | Quantity 21445 | | Quantity 21446 | GDT 21447 | Quantity 21448 | 0..1 21449 |
| | | Lower Quantity 21450 | Element 21451 | Quantity Specification 21452 | Lower 21453 | Quantity 21454 | | Quantity 21455 | GDT 21456 | Quantity 21457 | 0..1 21458 |
| | | Upper Quantity 21459 | Element 21460 | Quantity Specification 21461 | Upper 21462 | Quantity 21463 | | Quantity 21464 | GDT 21465 | Quantity 21466 | 0..1 21467 |
| | Decimal Specification 21468 | | Element 21469 | Prop. Value 21470 | | Numeric Specification 21471 | | Details 21472 | | | 0..1 21473 |
| | | Decimal Value 21474 | Element 21475 | Decimal Specification 21476 | | Decimal Value 21477 | Decimal 21478 | Value 21479 | GDT 21480 | Decimal Value 21481 | 0..1 21482 |

Fig. 214c

| GDT | | | Cat. | Obj. Class | Prop. Qual. | Prop. | Rep./ Assn. Qual. | Rep./ Assn. | Type | Type Name | Card. |
|---|---|---|---|---|---|---|---|---|---|---|---|
| | | Lower Deci-mal Value 21483 | Ele-ment 21484 | Deci-mal Specifi-cation 21485 | Lower 21486 | Decimal Value 21487 | Deci-mal 21488 | Value 21489 | GDT 21490 | Deci-mal Value 21491 | 0..1 21492 |
| | | Upper Deci-mal Value 21493 | Ele ment 21494 | Deci-mal Specifi-cation 21495 | Upper 21496 | Decimal Value 21497 | Deci-mal 21498 | Value 21499 | GDT 21401a | Deci-mal Value 21402a | 0..1 21403a |
| | Float Specific-ation 21404a | | Ele-ment 21405a | Prop. Value 21406a | | Float Specifi-cation 21407a | | Details 21408a | | | 0..1 21409a |
| | | Float Value 21410a | Ele-ment 21411a | Float Specifi-cation 21412a | | Float Value 21413a | Float 21414a | Value 21415a | GDT 21416a | Float Value 21417a | 0..1 21418a |

Fig. 214d

| GDT | | | Cat. | Obj. Class | Prop. Qual. | Prop. | Rep./ Asso. Qual. | Rep./ Assn. | Type | Type Name | Card. |
|---|---|---|---|---|---|---|---|---|---|---|---|
| | | Lower Float Value 21419a | Ele-ment 21420a | Float Specifi-cation 21421a | Lower 21422a | Float Value 21423a | Float 21424a | Value 21425a | GDT 21426a | Float Value 21427a | 0..1 21428a |
| | | Upper Float Value 21429a | Ele-ment 21430a | Float Specifi-cation 21431a | Upper 21432a | Float Value 21433a | Float 21434a | Value 21435a | GDT 21436a | Float Value 21437a | 0..1 21438a |
| | In-eger Specifi-cation 21439a | | Ele-ment 21440a | Prop. Value 21441a | | Integer Specifi-cation 21442a | | Details 21443a | | | 0..1 21444a |
| | | Integer Value 21445a | Ele-ment 21446a | Integer Specifi-cation 21447a | | Integer Value 21448a | Integer 21449a | Value 21450a | GDT 21451a | Integer Value 21452a | 0..1 21453a |
| | | Lower Integer Value 21454a | Ele-ment 21455a | Integer Specifi-cation 21456a | Lower 21457a | Integer Value 21458a | Integer 21459a | Value 21460a | GDT 21461a | Integer Value 21462a | 0..1 21463a |

Fig. 214e

| GDT | | | Cat. | Obj. Class | Prop. Qual. | Prop. | Rep./ Assn. Qual. | Rep./ Assn. | Type | Type Name | Card. |
|---|---|---|---|---|---|---|---|---|---|---|---|
| | | Upper Integer Value 21464a | Ele-ment 21465a | Integer Specifi-cation 21466a | Upper 21467a | Integer Value 21468a | Integer 21469a | Value 21470a | GDT 21471a | Integer Value 21472a | 0..1 21473a |
| | Date Specifi-cation 21474a | | Ele-ment 21475a | Prop. Value 21476a | | Date Specifi-cation 21477a | | Details 21478a | | | 0..1 21479a |
| | | Date 21480a | Ele-ment 21481a | Date Specifi-cation 21482a | | | | Date 21483a | GDT 21484a | Date 21485a | 0..1 21486a |
| | | Start Date 21487a | Ele-ment 21488a | Date Specifi-cation 21489a | | Start 21490a | | Date 21491a | GDT 21492a | Date 21493a | 0..1 21494a |
| | | End Date 21495a | Ele-ment 21496a | Date Specifi-cation 21497a | | End 21498a | | Date 21499a | GDT 21401b | Date 21402b | 0..1 21403b |

Fig. 214f

| GDT | | | Cat. | Obj. Class | Prop. Qual. | Prop. | Rep./Assn. Qual. | Rep./Assn. | Type | Type Name | Card. |
|---|---|---|---|---|---|---|---|---|---|---|---|
| | Time Specification 21404b | | Element 21405b | Prop. Value 21406b | | Time Specification 21407b | | Details 21408b | | | 0..1 21409b |
| | | Time 21410b | Element 21411b | Time Specification 21412b | | | | Time 21413b | GDT 21414b | Time 21415b | 0..1 21416b |
| | | Start Time 21417b | Element 21418b | Time Specification 21419b | | Start 21420b | | Time 21421b | GDT 21422b | Time 21423b | 0..1 21424b |
| | | End Time 21425b | Element 21426b | Time Specification 21427b | | End 21428b | | Time 21429b | GDT 21430b | Time 21431b | 0..1 21432b |
| | Date Time Specification 21433b | | Element 21434b | Prop. Value 21435b | | Date Time Specification 21436b | | Details 21437b | | | 0..1 21438b |

Fig. 214g

| GDT | | | Cat. | Obj. Class | Prop. Qual. | Prop. | Rep./ Assn. Qual. | Rep./ Assn. | Type | Type Name | Card. |
|---|---|---|---|---|---|---|---|---|---|---|---|
| | | Date Time 21439b | Ele-ment 21440b | Date Time Specifi-cation 21441b | | | | Date Time 21442b | GDT 21443b | Date Time 21444b | 0..1 21445b |
| | | Start Date Time 21446b | Ele-ment 21447b | Date Time Specifi-cation 21448b | | Start 21449b | | Date Time 21450b | GDT 21451b | Date Time 21452b | 0..1 21453b |
| | | End Date Time 21454b | Ele-ment 21455b | Date Time Specifi-cation 21456b | | End 21457b | | Date Time 21458b | GDT 21459b | Date Time 21460b | 0..1 21461b |
| | Name Specifi-cation 21462b | | Ele-ment 21463b | Prop. Value 21464b | | Name Specifi-cation 21465b | | Details 21466b | | | 0..1 21467b |
| | | Name 21468b | Ele-ment 21469b | Name Specifi-cation 21470b | | Name 21471b | | Name 21472b | GDT 21473b | Name 21474b | 0..1 21475b |

Fig. 214h

| GDT | | | Cat. | Obj. Class | Prop. Qual. | Prop. | Rep./ Assn. Qual. | Rep./ Assn. | Type | Type Name | Card. |
|---|---|---|---|---|---|---|---|---|---|---|---|
| | Indicator Specification 21476b | | Element 21477b | Prop. Value 21478b | | Indicator Specification 21479b | | Details 21480b | | | 0..1 21481b |
| | | Indicator 21482b | Element 21483b | Indicator Specification 21484b | | Indicator 21485b | | Indicator 21486b | GDT 2 1587b | Indicator 21488b | 0..1 21489b |
| | Interval Type Code 21490b | | Element 21491b | Prop. Value 21492b | | Interval Type 21493b | | Code 21494b | GDT 21495b | Interval Type Code 21496b | 0..1 21497b |
| | Preferred Name 21498b | | Element 21499b | Prop. Value 21401c | | Preferred Name 21402c | | Name 21403c | GDT 21404c | Name 21405c | 0..n 21406b |
| | Synonymous Name 21407c | | Element 21408c | Prop. Value 21409c | | Synonymous Name 21410c | | Name 21411c | GDT 21412c | Name 21413c | 0..n 21414c |

Fig. 214i

| GDT | | | Cat. | Obj. Class | Prop. Qual. | Prop. | Rep./ Assn. Qual. | Rep./ Assn. | Type | Type Name | Card. |
|---|---|---|---|---|---|---|---|---|---|---|---|
| | Abbrev-iation Name 21415c | | Ele-ment 21416c | Prop. Value 21417c | | Abbrevi-ation Name 21418c | | Name 21419c | GDT 21420c | Name 21421c | 0..n 21422c |
| | Icon Attach-ment 21423c | | Ele-ment 21424c | Prop. Value 21425c | | Icon 21426c | | Attach-ment 21427c | GDT 21428c | Attach-ment 21429c | 0..1 21430c |
| | Attach-ment Web Ad-dress 21431c | | Ele-ment 21432c | Prop. Value 21433c | | Attach-ment 21434c | | Web Add-ress 21435c | GDT 21436c | Web Add-ress 21437c | 0..1 21438c |

Fig. 215

| GDT | Cat. | Obj. Class | Prop. | Rep./ Assn. | Type | Lgth. | Card. | Remarks |
|---|---|---|---|---|---|---|---|---|
| Purchase Order Ordered Indicator 21500 | | Purchase Order 21502 | Ordered Indicator 21504 | Indicator 21506 | CCT: Indicator 21508 | | | |

Fig. 216

| CDT | Cat. | Obj. Class | Prop. | Rep./ Assn. | Type | Type Name | Lgth. | Card. | Remarks |
|---|---|---|---|---|---|---|---|---|---|
| Purchasing Group ID 21600 | | Purchasing Group 21602 | Identification 21604 | Identifier 21606 | CCT 21608 | Identifier 21610 | 1..20 21612 | | |

Fig. 217

| GDT | | Cat. | Obj. Class | Prop. | Rep./ Assn. | Type | Type Name | Lgth. | Card. | Remarks |
|---|---|---|---|---|---|---|---|---|---|---|
| Quantity 21700 | | | | | Quantity 21702 | xsd 21704 | Decimal 21706 | 13.6 21708 | | |
| | unit Code 21710 | Attribute 21712 | Quantity 21714 | Unit 21716 | Code 21718 | xsd 21720 | token 21722 | 1..3 21724 | 1 21726 | |

Fig. 218

| GDT | Cat. | Obj. Class | Prop. | Rep./ Assn. | Type | Type Name | Lgth. | Card. | Remarks |
|---|---|---|---|---|---|---|---|---|---|
| Quantity Discrep-ancy Code 21800 | | Quantity 21802 | Discrepancy 21804 | Code 21806 | CCT 21808 | Code 21810 | 1.4 21812 | | Restricted 21814 |

Fig. 219

| CDT | | | Cat. | Obj. Class Qual. | Obj. Class | Prop. Qual. | Prop. | Rep./ Assn Qual. | Rep./ Assn. | Type | Type Name | Lgth. | Card. | Remarks |
|---|---|---|---|---|---|---|---|---|---|---|---|---|---|---|
| Quantity-Time Series 21900 | | | | Quan-tity 21902 | Time Series 21904 | | | | Details 21906 | GDT 21908 | Time Series 21910 | | | Restricted 21912 |
| | Item 21914 | | Element 21916 | | Time Series 21918 | | Item 21920 | | Details 21922 | | | | 1..n 21924 | |
| | | Validity Period 21926 | Element 21928 | | Time Series 21930 | | Validity Period 21932 | | Details 21934 | GDT 21936 | Date Time Period 21938 | | 1 21940 | |
| | | Quantity 21942 | Element 21944 | | Time Series 21946 | | Quantity 21948 | | Quanti-ty 21950 | GDT 21952 | Quantity 21954 | | 1 21956 | |
| | | Fixed-Indicator 21958 | Element 21960 | | Time Series 21962 | | Fixed Indicator 21964 | | Indica-tor 21966 | GDT 21968 | Fixed Indicator 21970 | | 0..1 21972 | |

Fig. 220

| GDT | | Cat. | Obj. Class | Prop. | Rep./ Assn. | Type | Type Name | Lgth. | Card. | Remarks |
|---|---|---|---|---|---|---|---|---|---|---|
| Quantity Toler-ance 22000 | | | Quantity Tolerance 22002 | Details 22004 | Details 22006 | | | | | |
| | Over Percent 22008 | Element 22010 | Quantity Tolerance 22012 | Over 22014 | Percent 22016 | GDT 22018 | GDT: Percent 22020 | | 0..1 22022 | |
| | Over Percent Unlimited-Indicator 22024 | Element 22026 | Quantity Tolerance 22028 | Over Percen Unlimited 22030 | Indicator 22032 | GDT 22034 | GDT: Value Unlimited Indicator 22036 | | 0..1 22038 | |
| | Under Percent 22040 | Element 22042 | Quantity Tolerance 22044 | Under 22046 | Percent 22048 | GDT 22050 | GDT: Percent 22052 | | 0..1 22054 | |

Fig. 221

| GDT | | Cat. | Obj. Class | Prop. | Rep./ Assn. | Type | Type Name | Lgth. | Card. | Remarks |
|---|---|---|---|---|---|---|---|---|---|---|
| Recurrence 22100 | | | Recurrence 22102 | | Details 22104 | | | | | |
| | Duration 22106 | | Recurrence 22108 | Duration 22110 | Duration 22112 | GDT 22114 | Duration 22116 | | 1 22118 | |
| | Value 22120 | | Recurrence 22122 | Value 22124 | Value 22126 | GDT 22128 | Integer Value 22130 | 1..3 22132 | 1 22134 | |

Fig. 222

| GDT | | Cat. | Obj. Class | Prop. Term | Rep./ Assn. | Type | Type Name | Lgth. | Card. | Remarks |
|---|---|---|---|---|---|---|---|---|---|---|
| Region Code 22200 | | | Region 22202 | Identification 22204 | Code 22206 | CCT 22208 | Code 22210 | | | |
| | listID 22212 | Attribute 22214 | Code List 22216 | Identification 22218 | Identifier 22220 | xsd 22222 | token 22224 | 1..60 22226 | 0..1 22228 | |
| | list Version ID 22230 | Attribute 22232 | Code List 22234 | Version 22236 | Identifier 22238 | xsd 22240 | token 22242 | 1..15 22244 | 0..1 22246 | |
| | list Agency ID 22248 | Attribute 22250 | Code List Agency 22252 | Identification 22254 | Identifier 22256 | xsd 22258 | token 22260 | 1..60 22262 | 0..1 22264 | |
| | list Agency SchemeID 22266 | Attribute 22268 | Code List Agency 22270 | Scheme 22272 | Identifier 22274 | xsd 22276 | token 22278 | 1..60 22280 | 0..1 22282 | |
| | list Agency Scheme AgencyID 22284 | Attribute 22286 | Code List Agency 22288 | Scheme Agency 22290 | Identifier 22292 | xsd 22294 | token 22296 | 3 22298 | 0..1 22201 | |

Fig. 223

| GDT | Cat. | Obj. Class | Prop. | Rep./ Assn. | Type | Type Name | Lgth. | Card. | Remarks |
|---|---|---|---|---|---|---|---|---|---|
| RequiredIndicator 22300 | | | Required 22302 | Indicator 22304 | CCT 22306 | Indicator 22308 | | | |

Fig. 224a

| CDT | | | | Cat. | Obj. Class Qual. | Obj. Class | Prop. Qual. | Prop. | Rep./ Assn Qual. | Rep./ Assn. | Type | Type Name | Lgth. | Card. | Remarks |
|---|---|---|---|---|---|---|---|---|---|---|---|---|---|---|---|
| Revision Quantity-Time Series 22400 | | | | | Revision Quantity 22402 | Time Series 22404 | | | | Details 22406 | GDT 22408 | Time Series 22410 | | | Restricted 22412 |
| | Item 22414 | | | Element 22416 | | Time Series 22418 | | Item 22420 | | Details 22422 | | | | 1..n 22424 | |
| | | Validity Period 22426 | | Element 22428 | | Time Series 22430 | | Validity Period 22432 | | Details 22434 | GDT 22436 | Date Time Period 22438 | | 1 22440 | |
| | | | Start Date Time 22442 | Element 22444 | | Time Series 22446 | | Validity Period Start 22448 | | Date Time 22450 | GDT 22452 | Date Time 22454 | | 1 22456 | |
| | | | End Date Time 22458 | Element 22460 | | Time Series 22462 | | Validity Period End 22464 | | Date Time 22466 | GDT 22468 | Date Time 22470 | | 1 22472 | |
| | | Quantity 22474 | | Element 22476 | | Time Series 22478 | | Quantity 22480 | | Quantity 22482 | GDT 22484 | Quantity 22486 | | 1 22488 | |

Fig. 224b

| CDT | | | | Cat. | Obj. Class Qual. | Obj. Class | Prop. Qual. | Prop. | Rep./ Assn. Qual. | Rep./ Assn. | Type | Type Name | Lgth. | Card. | Remarks |
|---|---|---|---|---|---|---|---|---|---|---|---|---|---|---|---|
| | | Fixed-Indicator 22490 | | Element 22492 | | Time Series 22494 | | Fixed Indicator 22496 | | Indicator 22498 | GDT 22401 | Fixed Indicator 22403 | | 0..1 22405 | |
| | | Adjustment-Reason Code 22407 | | Element 22409 | | Time Series 22411 | | Adjustment Reason 22413 | | Code 22415 | GDT 22417 | Adjustment Reason Code 22419 | | 0..1 22421 | |
| | | Note 22423 | | Element 22425 | | Time Series 22427 | | Note 22429 | | Note 22431 | GDT 22433 | Note 22435 | | 0..1 22437 | |

Fig. 225

| GDT | Cat. | Obj. Class | Prop. | Rep./ Assn. | Type | Type Name | Lgth. | Card. | Remarks |
|---|---|---|---|---|---|---|---|---|---|
| Scale Axis Interval Boundary Type Code 22500 | | Scale Axis 22502 | Interval Boundary Type Code 22504 | Code 22506 | CCT 22508 | Code 22510 | 1 22512 | | Restricted 22514 |

Fig. 226

| GDT | Cat. | Obj. Class | Prop. | Rep./ Assn. | Type | Type Name | Lgth. | Card. | Remarks |
|---|---|---|---|---|---|---|---|---|---|
| ScheduleLine Commitment Code 22600 | | Schedule Line 22602 | Commitment 22604 | Code 22606 | CCT 22608 | Code 22610 | 1..3 22612 | | Restricted 22614 |

Fig. 227

| GDT | Cat. | Obj. Class | Prop. | Rep./ Assn. | Type | Type Name | Lgth. | Card. | Remarks |
|---|---|---|---|---|---|---|---|---|---|
| ScoreCardID 22700 | | Score Card 22702 | Identification 22704 | Identifier 22706 | CCT 22708 | Identifier 22710 | 1..20 22712 | | Restricted 22714 |

Fig. 228

| GDT | Cat. | Obj. Class | Prop. | Rep./ Assn. | Type | Type Name | Lgth. | Card. | Remarks |
|---|---|---|---|---|---|---|---|---|---|
| SubContracting Indicator 22800 | | Sub Contracting 22802 | Indicator 22804 | Indicator 22806 | CCT 22808 | Indicator 22810 | | | |

Fig. 229

| GDT | Cat. | Obj. Class | Prop. | Rep./ Assn. | Type | Type Name | Lgth. | Card. | Remarks |
|---|---|---|---|---|---|---|---|---|---|
| SubHierarchy Definition Indicator 22900 | | | SubHierarchy Definition 22902 | Indicator 22904 | CCT 22906 | Indicator 22908 | | | |

Fig. 230

| GDT | Cat. | Obj. Class | Prop. | Rep./ Assn. | Type | Type Name | Lgth. | Card. | Remarks |
|---|---|---|---|---|---|---|---|---|---|
| Subject Area Code 23000 | | Subject Area 23002 | | Code 23004 | CCT 23006 | Code 23008 | 9 23010 | | Restricted 23012 |

Fig. 231

| GDT | | Cat. | Obj. Class | Prop. | Rep./ Assn. | Type | Type Name | Lgth. | Card. | Re- marks |
|---|---|---|---|---|---|---|---|---|---|---|
| Tax Jurisdic- tion Code 23100 | | Element 23102 | Tax Jurisdic- tion Code 23104 | Tax Jurisdic- tion Code 23106 | Code 23108 | CCT 23110 | Code 23112 | 1..15 23114 | | |
| | listID 23116 | Attribute 23118 | Code List 23120 | Identifica- tion 23122 | Identifier 23124 | xsd 23126 | token 23128 | 1..60 23130 | 0..1 23132 | Option- al 23134 |
| | list Version ID 23136 | Attribute 23138 | Code List 23140 | Version 23142 | Identifier 23144 | xsd 23146 | token 23148 | 1..15 23150 | 0..1 23152 | Option- al 23154 |
| | list Agency ID 23156 | Attribute 23158 | Code List Agency 23160 | Identifica- tion 23162 | Identifier 23164 | xsd 23166 | token 23168 | 1..60 23170 | 0..1 23172 | Option- al 23174 |
| | list Agency Scheme ID 23176 | Attribute 23178 | Code List Agency 23180 | Scheme 23182 | Identifier 23184 | xsd 23186 | token 23188 | 1..60 23190 | 0..1 23192 | Option- al 23194 |
| | list Agency Scheme Agency ID 23196 | Attribute 23198 | Code List Agency 23101 | Scheme Agency 23103 | Identifier 23105 | xsd 23107 | token 23109 | 3 23111 | 0..1 23113 | Option- al 23115 |

Fig. 232

| GDT | Cat. | Obj. Class | Prop. | Rep./ Assn. | Type | Type Name | Lgth. | Card. | Remarks |
|---|---|---|---|---|---|---|---|---|---|
| Tex Searchable Indicator 23200 | | | Text Searchable 23202 | Indicator 23204 | CCT 23206 | Indicator 23208 | | | |

Fig. 233

| GDT | Cat. | Obj. Class | Prop. | Rep./ Assn. | Type | Type Name | Lgth. | Card. | Remarks |
|---|---|---|---|---|---|---|---|---|---|
| Time 23300 | | | Time 23302 | DateTime 23304 | CCT 23306 | Time 23308 | | | |

Fig. 234

| GDT | | Cat. | Obj. Class | Prop. | Rep./ Assn. | Type | Type Name | Lgth. | Card. | Remarks |
|---|---|---|---|---|---|---|---|---|---|---|
| Time Period <u>23400</u> | | | Time Period <u>23402</u> | Details <u>23404</u> | | | | | | |
| | Start Time <u>23406</u> | Element <u>23408</u> | Time Period <u>23410</u> | Start Time <u>23412</u> | Time <u>23414</u> | GDT <u>23416</u> | Time <u>23418</u> | | 0..1 <u>23420</u> | |
| | End Time <u>23422</u> | Element <u>23424</u> | Time Period <u>23426</u> | End Time <u>23428</u> | Time <u>23430</u> | GDT <u>23432</u> | Time <u>23434</u> | | 0..1 <u>23436</u> | |
| | Duration <u>23438</u> | Element <u>23440</u> | Time Period <u>23442</u> | Duration <u>23444</u> | Duration <u>23446</u> | GDT <u>23448</u> | Duration <u>23450</u> | | 0..1 <u>23452</u> | |

Fig. 235a

| GDT | | | Cat. | Obj. Class | Prop. | Rep./ Assn. | Type | Type Name | Lgth. | Card. | Remarks |
|---|---|---|---|---|---|---|---|---|---|---|---|
| Time-Series 23500 | | | | Time Series 23502 | | Details 23504 | | | | | |
| | Item 23506 | | Element 23508 | Time Series 23510 | Item 23512 | Details 23514 | | | | 1..n 23516 | |
| | | Validity Period 23518 | Element 23520 | Time Series 23522 | Validity Period 23524 | Details 23526 | GDT 23528 | Date Time Period 23530 | | 1 23532 | |
| | | Quantity 23534 | Element 23536 | Time Series 23538 | Quantity 23540 | Quantity 23542 | GDT 23544 | Quantity 23546 | | 0..1 23548 | |

Fig. 235b

| GDT | | | Cat. | Obj. Class | Prop. | Rep./ Assn. | Type | Type Name | Lgth. | Card. | Remarks |
|---|---|---|---|---|---|---|---|---|---|---|---|
| | | Price 23550 | Element 23552 | Time Series 23554 | Price 23556 | Price 23558 | GDT 23560 | Price 23562 | | 0..1 23564 | |
| | | Fixed-Indicator 23566 | Element 23568 | Time Series 23570 | Fixed Indicator 23572 | Indicator 23574 | GDT 23576 | Fixed Indicator 23578 | | 0..1 23580 | |
| | | Adjust-ment-Reason Code 23582 | Element 23584 | Time Series 23586 | Adjustment Reason 23588 | Code 23590 | GDT 23592 | Adjustment Reason Code 23594 | | 0..1 23594 | |
| | | Note 23596 | Element 23598 | Time Series 23501 | Note 23503 | Note 23505 | GDT 23507 | Note 23509 | | 0..1 23511 | |

Fig. 236

| GDT | Cat. | Obj. Class | Prop. | Rep./ Assn. | Type | Type Name | Lgth. | Card. | Remarks |
|---|---|---|---|---|---|---|---|---|---|
| Time Zone Difference Value 23600 | | | Time Zone Difference 23602 | Value 23604 | GDT 23606 | Decimal Value 23608 | 2.2 23610 | | Max.Value 12 Min. Value 12 23612 |

Fig. 237

| GDT | Cat. | Obj. Class | Prop. | Rep./Assn. Qual. | Rep./ Assn. | Type | Type Name | Lgth. | Card. | Remarks |
|---|---|---|---|---|---|---|---|---|---|---|
| Total Number Value 23700 | | | | Total Number 23702 | Value 23704 | xsd 23706 | nonNegative Integer 23708 | 1..9 23710 | | |

Fig. 238

| GDT | Cat. | Obj. Class | Prop. | Rep./ Assn. | Type | Type Name | Lgth. | Card. | Remarks |
|---|---|---|---|---|---|---|---|---|---|
| Transmission ID 23800 | | Transmission 23802 | Identification 23804 | Identifier 23806 | CCT 23808 | Identifier 23810 | 1..40 23812 | | Restricted 23814 |

Fig. 239

| GDT | | Cat. | Obj. Class | Prop. | Rep./ Assn. | Type | Type Name | Lgth. | Card. | Remarks |
|---|---|---|---|---|---|---|---|---|---|---|
| Transport Means 23900 | | | Transport-Means 23902 | Details 23904 | Details 23906 | | | | | |
| | ID 23908 | Element 23910 | Transport-Means 23912 | Identifi-cation 23914 | Identifier 23916 | CCT 23918 | Identifier 23920 | 1..20 23922 | 0..1 23924 | Restricted 23926 |
| | Description Code 23928 | Element 23930 | Transport-Means 23932 | Descrip-tion 23934 | Code 23936 | GDT 23938 | Transport Means Descrip-tionCode 23940 | | 1 23942 | |

Fig. 240

| GDT | Cat. | Obj. Class | Prop. | Rep./ Assn. | Type | Type Name | Lgth. | Card. | Remarks |
|---|---|---|---|---|---|---|---|---|---|
| Transport Means Description Code 24000 | | Transport Means 24002 | Description 24004 | Code 24006 | CCT 24008 | Code 24010 | 1...4 24012 | | Restricted 24014 |

Fig. 241

| GDT | Cat. | Obj. Class | Prop. | Rep./ Assn. | Type | Type Name | Lgth. | Card. | Remarks |
|---|---|---|---|---|---|---|---|---|---|
| Transport Mode Code 24100 | | Transport Mode 24102 | Code 24104 | Code 24106 | CCT 24108 | Code 24110 | 1..2 24112 | | Restricted 24114 |

Fig. 242

| GDT | Cat. | Obj. Class | Prop. | Rep./ Assn. | Type | Type Name | Lgth. | Card. | Remarks |
|---|---|---|---|---|---|---|---|---|---|
| Transport Service Level Code 24200 | | Transport 24202 | Service Level Code 24204 | Code 24206 | CCT 24208 | Code 24210 | 1..2 24212 | | Restricted 24214 |

Fig. 243

| GDT | | Cat. | Obj. Class | Prop. | Rep./ Assn. | Type | Type Name | Lgth. | Card | Remarks |
|---|---|---|---|---|---|---|---|---|---|---|
| Transport Tracking 24300 | | | Transport Tracking 24302 | Details 24304 | Details 24306 | | | | | |
| | ID 24308 | Element 24310 | Transport Tracking 24312 | Identifi- cation 24314 | Identifier 24316 | CCT 24318 | Identifier 24320 | 1..35 24322 | 1 | Restricted 24324 |
| | Web Address 24326 | Element 24328 | Transport Tracking 24330 | Web Address 24332 | Electronic Address 24334 | GDT 24336 | Web Address 24338 | | 0..1 24340 | |

Fig. 244

| GDT | | Cat. | Obj. Class | Prop. | Rep./Assn. Qual. | Rep./ Assn. | Type | Type Name | Lgth. | Card. | Remarks |
|---|---|---|---|---|---|---|---|---|---|---|---|
| Tuple Lgth. Value 24400 | | | | | Tuple Lgth. 24402 | Value 24404 | xsd 24406 | nonNegative Integer 24408 | 1..2 24410 | | |

Fig. 245

| GDT | Cat. | Obj. Class | Prop. | Rep./ Assn. | Type | Type Name | Lgth. | Card. | Remarks |
|---|---|---|---|---|---|---|---|---|---|
| Unplanned Item Permission Code 24500 | | Unplanned Item 24502 | Permission Code 24504 | Code 24506 | CCT 24508 | Code 24510 | 2 24512 | | Restricted 24514 |

Fig. 246

| GDT | Cat. | Obj. Class | Prop. | Rep./ Assn. | Type | Type Name | Lgth. | Card. | Remarks |
|---|---|---|---|---|---|---|---|---|---|
| Value Difference Indicator 24600 | | | Value Difference 24602 | Indicator 24604 | CCT 24606 | Indicator 24608 | | | |

Fig. 247

| GDT | Cat. | Obj. Class | Prop. | Rep./ Assn. | Type | Type Name | Lgth. | Card. | Remarks |
|---|---|---|---|---|---|---|---|---|---|
| Value Unlimited Indicator 24700 | | Value 24702 | Unlimited Indicator 24704 | Indicator 24706 | CCT 24708 | Indicator 24710 | | | |

Fig. 248

| GDT | Cat. | Obj. Class | Prop. | Rep./ Assn. | Type | Type Name | Lgth. | Card. | Remarks |
|---|---|---|---|---|---|---|---|---|---|
| VersionID 24800 | Element 24802 | Version 24804 | Identifica-tion 24806 | Identifier 24808 | CCT 24810 | Identifier 24812 | 1..32 24814 | | Restricted 24816 |

Fig. 249

| GDT | Cat. | Obj. Class | Prop. | Rep./ Assn. | Type | Type Name | Lgth. | Card. | Remarks |
|---|---|---|---|---|---|---|---|---|---|
| Visible Indicator 24900 | | | Visible 24902 | Indicator 24904 | CCT 24906 | Indicator 24908 | | | |

Fig. 250

| GDT | | Cat. | Obj. Class | Prop. | Rep./ Assn. | Type | TypeName | Lgth. | Card. | Remarks |
|---|---|---|---|---|---|---|---|---|---|---|
| Web Address | | | Web Address 25002 | Address 25004 | Electronic Address 25006 | CCT 25008 | Electronic Address 25010 | 1.255 25012 | | Restricted 25014 |
| | language Code 25016 | Attribut 25018 | Web Address 25020 | Language Code 25022 | Code 25024 | xsd 25026 | Language 25028 | 2..9 25030 | 0..1 25032 | |

Fig. 251

| GDT | | Cat. | Obj. Class | Prop. | Rep./ Assn. | Type | Type Name | Lgth. | Card. | Remarks |
|---|---|---|---|---|---|---|---|---|---|---|
| Work Agreement ID 25100 | | | Work Agreement 25102 | Identification 25104 | Identifier 25106 | GDT 25108 | Identifier 25110 | 1..40 25112 | | Restricted 25114 |
| | Scheme ID 25116 | Attribute 25118 | Identification Scheme 25120 | Identification 25122 | Identifier 25124 | xsd 25126 | token 25128 | 1..60 25130 | 0..1 25132 | |
| | Scheme Agency ID 25134 | Attribute 25136 | Identification Scheme Agency 25138 | Identification 25140 | Identifier 25142 | xsd 25144 | token 25146 | 1..60 25148 | 0..1 25150 | |

FIG. 280A

| Package 28000 | L. 1 28002 | L. 2 28004 | L. 3 28006 | L. 4 28008 | L. 5 28010 | Card. 28012 | Type 28014 | Name 28016 |
|---|---|---|---|---|---|---|---|---|
| Invoice Message 28018 | Invoice Message 28020 | | | | | | MDT 28022 | InvoiceMessage 28024 |
| Message Header 28026 | | Message Header 28030 | | | | 0..1 28032 | GDT 28034 | MessageHeader 28036 |
| | | | MessageID 28038 | | | 1 28040 | GDT 28042 | MessageID 28044 |
| | | | Reference MessageID 28046 | | | 0..1 28048 | GDT 28050 | MessageID 28052 |
| | | | Creation DateTime 28054 | | | 1 28056 | GDT 28058 | DateTime 28060 |
| | | | Sender Party 28062 | | | 0..1 28064 | GDT 28066 | BusinessDocument MessageHeaderParty 28068 |
| | | | Recipient Party 28070 | | | 0..1 28072 | GDT 28074 | BusinessDocument MessageHeaderParty 28076 |

FIG. 280B

| InvoiceMessage 28018 | | | | | |
|---|---|---|---|---|---|
| Invoice 28028 | Invoice 28078 | | 1 28079 | GDT 28080 | Invoice 28081 |
| | | ID 28082 | 1 28084 | GDT 28086 | BusinessTransactionDocumentID 28088 |
| | | BillToID 28090 | 0..1 28092 | GDT 28094 | BusinessTransactionDocumentID 28096 |
| | | TypeCode 28098 | 1 28000A | GDT 28002A | BusinessTransactionDocumentTypeCode 28004A |
| | | DateTime 28006A | 1 28008A | GDT 28010A | DateTime 28012A |
| | | Cancellation InvoiceIndicator 28014A | 0..1 28016A | GDT 28018A | InvoiceCancellationInvoiceIndicator 28020A |
| | | Acceptance StatusCode 28022A | 0..1 28024A | GDT 28026A | AcceptanceStatusCode 28028A |
| | | Note 28030A | 0..1 28032A | GDT 28034A | Note 28036A |

FIG. 280C

| | | | | |
|---|---|---|---|---|
| InvoiceMessage 28018 | | | | |
| Invoice 28028 | | | | |
| Party 28038A | BillToParty 28056A | 1 28058A | GDT 28060A | BusinessTransactionDocumentParty 28062A |
| | BillFromParty 28064A | 1 28066A | GDT 28068A | BusinessTransactionDocumentParty 28070A |
| | BuyerParty 28072A | 0..1 28074A | GDT 28076A | BusinessTransactionDocumentParty 28078A |
| | SellerParty 28080A | 0..1 28082A | GDT 28084A | BusinessTransactionDocumentParty 28086A |
| | ProductRecipient Party 28088A | 0..1 28090A | GDT 28092A | BusinessTransactionDocumentParty 28094A |
| | VendorParty 28096A | 0..1 28098A | GDT 28000B | BusinessTransactionDocumentParty 28002B |
| | ManufacturerParty 28004B | 0..1 28006B | GDT 28008B | BusinessTransactionDocumentParty 28010B |
| | PayerParty 28012B | 0..1 28014B | GDT 28016B | BusinessTransactionDocumentParty 28018B |
| | PayeeParty 28020B | 0..1 28022B | GDT 28024B | BusinessTransactionDocumentParty 28026B |
| | CarrierParty 28028B | 0..1 28030B | GDT 28032B | BusinessTransactionDocumentParty 28034B |

FIG. 280D

| | | | | | | |
|---|---|---|---|---|---|---|
| InvoiceMessage | | 28018 | | | | |
| Invoice | | 28028 | | | | |
| Location 28040A | ShipToLocation 28036B | | 0..1 28038B | GDT 28040B | BusinessTransactionDocumentLocation 28042B |
| | ShipFrom Location 28044B | | 0..1 28046B | GDT 28048B | BusinessTransactionDocumentLocation 28050B |
| Delivery Information 28042A | DeliveryTerms 28052B | | 0..1 28054B | GDT 28056B | DeliveryTerms 28058B |
| Payment Information 28044A | CashDiscount Terms 28060B | | 0..1 28062B | GDT 28064B | CashDiscountTerms 28066B |
| | PaymentForm 28068B | | 0..1 28070B | GDT 28071B | PaymentForm 28072B |
| Price Information 28046A | Price 28088B | | 1 28090B | | |
| | | GrossAmount 28092B | 1 28094B | GDT 28096B | Amount 28098B |

FIG. 280E

| | | | | | | |
|---|---|---|---|---|---|---|
| InvoiceMessage 28018 | | | | | | |
| Invoice 28028 | | | | | | |
| Price Information 28046A | | NetAmount 28000C | 1 28002C | GDT 28004C | Amount 28006C |
| | | TaxAmount 28008C | 0..1 28010C | GDT 28012C | Amount 28014C |
| | | ExchangeRate 28016C | 0...1 28018C | GDT 28020C | ExchangeRate 28022C |
| Tax 28048A | ProductTax 28024C | | 0..n 28026C | GDT 28028C | ProductTax 28030C |
| Attachment 28050A | Attachment 28032C | | 0..n 28034C | GDT 28036C | Attachment 28038C |
| Description 28052A | Description 28040C | | 0..1 28042C | GDT 28044C | Description 28046C |
| | Confirmed Description 28048C | | 0..1 28050C | GDT 28052C | Description 28054C |
| Item 28054A | Item 28056C | | 1..n 28057C | GDT 28058C | InvoiceItem 28059C |
| | | ID 28060C | 1 28062C | GDT 28064C | BusinessTransaction DocumentItemID 28066C |

FIG. 280F

| | | | | | | |
|---|---|---|---|---|---|---|
| InvoiceMessage 28018 | | | | | | |
| Invoice 28028 | | | | | | |
| Item 28054A | BillToID 28068C | | 0..1 28070C | GDT 28072C | BusinessTransactionDocumentItemPartyID 28074C |
| | TypeCode 28076C | | 1 28078C | GDT 28080C | BusinessTransactionDocumentItemTypeCode 28082C |
| | Quantity 28084C | | 0..1 28086C | GDT 28088C | Quantity 28090C |
| | HierarchyRelationship 28092C | | 0..1 28094C | | |
| | | ParentItemID 28096C | 1 28098C | GDT 28000D | BusinessTransactionDocumentItemID 28002D |
| | | TypeCode 28004D | 1 28006D | CDT 28008D | ItemHierarchyRelationshipTypeCode 28010D |
| | DeliveryPeriod 28012D | | 0..1 28014D | GDT 28016D | DateTimePeriod 28018D |
| ProductInformation 28020D | Product 28038D | | 0..1 28040D | GDT 28042D | Product 28044D |

FIG. 280G

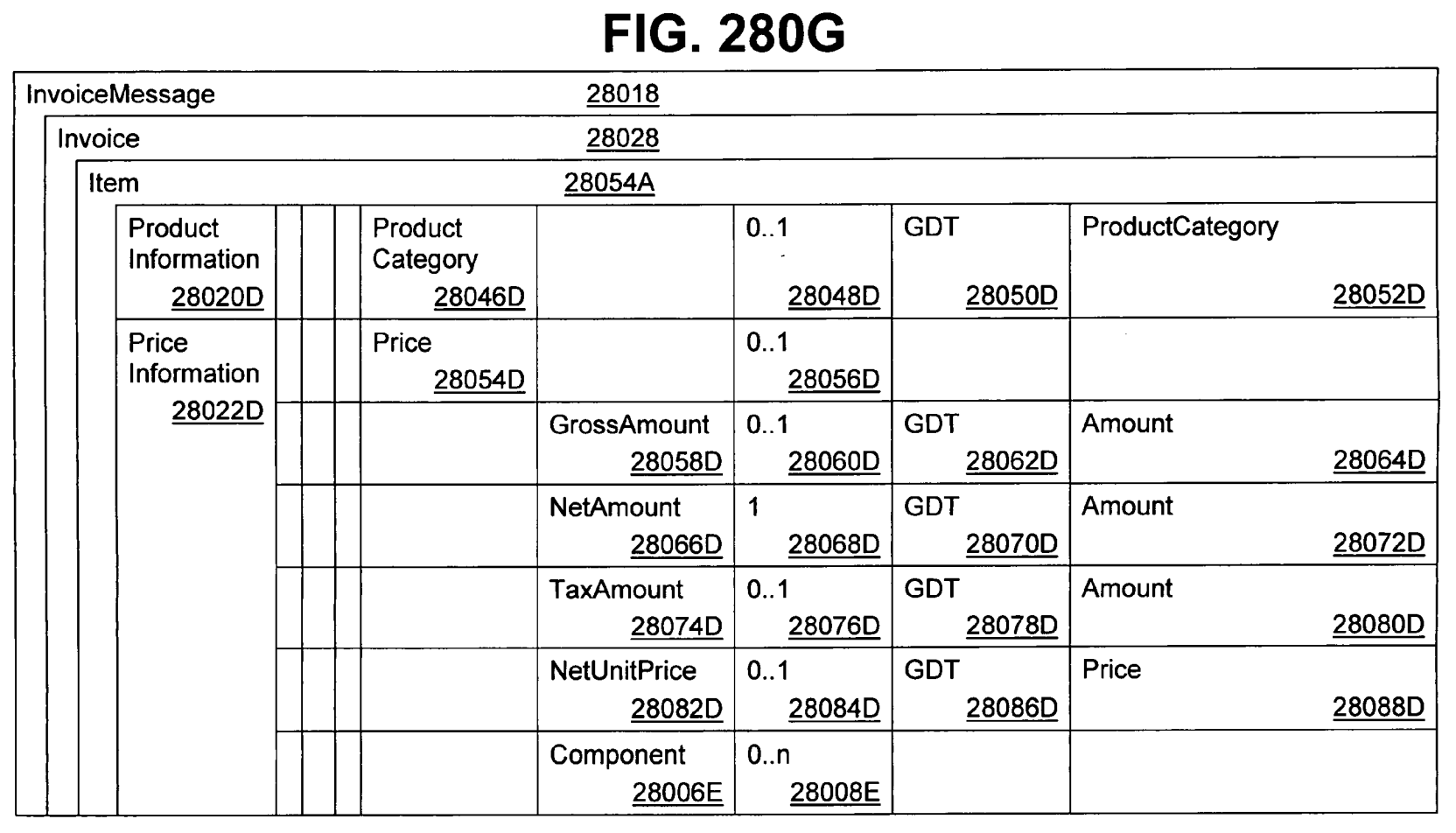

| | | | | | |
|---|---|---|---|---|---|
| InvoiceMessage 28018 | | | | | |
| Invoice 28028 | | | | | |
| Item 28054A | | | | | |
| Product Information 28020D | Product Category 28046D | | 0..1 28048D | GDT 28050D | ProductCategory 28052D |
| Price Information 28022D | Price 28054D | | 0..1 28056D | | |
| | | GrossAmount 28058D | 0..1 28060D | GDT 28062D | Amount 28064D |
| | | NetAmount 28066D | 1 28068D | GDT 28070D | Amount 28072D |
| | | TaxAmount 28074D | 0..1 28076D | GDT 28078D | Amount 28080D |
| | | NetUnitPrice 28082D | 0..1 28084D | GDT 28086D | Price 28088D |
| | | Component 28006E | 0..n 28008E | | |

FIG. 280H

| | | | | | |
|---|---|---|---|---|---|
| InvoiceMessage 28018 | | | | | |
| Invoice 28028 | | | | | |
| Item 28054A | | | | | |
| Tax 28024D | ProductTax 28014E | 0..n 28016E | GDT 28018E | ProductTax 28020E | |
| Party 28026D | BuyerParty 28022E | 0..1 28024E | GDT 28026E | BusinessTransactionDocument Party 28028E | |
| | SellerParty 28030E | 0..1 28032E | GDT 28034E | BusinessTransactionDocument Party 28036E | |
| | ProductRecipientParty 28038E | 0..1 28040E | GDT 28042E | BusinessTransactionDocument Party 28044E | |
| | VendorParty 28046E | 0..1 28048E | GDT 28050E | BusinessTransactionDocument Party 28052E | |
| | ManufacturerParty 28054E | 0..1 28056E | GDT 28058E | BusinessTransactionDocument Party 28060E | |
| | CarrierParty 28062E | 0..1 28064E | GDT 28066E | BusinessTransactionDocument Party 28068E | |

FIG. 280I

InvoiceMessage 28018

Invoice 28028

Item 28054A

| | | | | |
|---|---|---|---|---|
| Location 28028D | ShipToLocation 28070E | 0..1 28072E | GDT 28074E | BusinessTransactionDocumentLocation 28076E |
| | ShipFromLocation 28078E | 0..1 28080E | GDT 28082E | BusinessTransactionDocumentLocation 28084E |
| Delivery Information 28030D | DeliveryTerms 28086E | 0..1 28088E | GDT 28090E | DeliveryTerms 28092E |
| Business Trans-action Document Reference 28032D | PurchaseOrder Reference 28094E | 0..n 28096E | GDT 28098E | BusinessTransactionDocumentReference 28000F |
| | SalesOrder Reference 28002F | 0..n 28004F | GDT 28006F | BusinessTransactionDocumentReference 28008F |
| | DeliveryReference 28010F | 0..1 28012F | GDT 28014F | BusinessTransactionDocumentReference 28016F |
| | Service Acknowledgement Reference 28018F | 0..1 28020F | GDT 28022F | BusinessTransactionDocumentReference 28024F |

FIG. 280J

InvoiceMessage 28018

Invoice 28028

Item 28054A

| | | | | |
|---|---|---|---|---|
| Business Transaction Document Reference 28032D | OriginInvoice Reference 28026F | 0..1 28028F | GDT 28030F | BusinessTransactionDocumentReference 28032F |
| | PurchaseContract Reference 28034F | 0..1 28036F | GDT 28038F | BusinessTransactionDocumentReference 28040F |
| | SalesContract Reference 28042F | 0..1 28044F | GDT 28046F | BusinessTransactionDocumentReference 28048F |
| | BuyerProduct Catalogue Reference 28050F | 0..1 28052F | GDT 28054F | CatalogueReference 28056F |
| | SellerProduct CatalogReference 28058F | 0..1 28060F | GDT 28062F | CatalogueReference 28064F |
| Attachment 28034D | Attachment 28066F | 0..n 28068F | GDT 28070F | Attachment 28072F |
| Description 28036D | Description 28074F | 0..1 28076F | GDT 28078F | Description 28080F |

Fig. 290A

| Package 29000 | L1 29002 | L2 29004 | L3 29006 | L4 29008 | L5 29010 | Occ. 29012 | Datatype name 29014 |
|---|---|---|---|---|---|---|---|
| Purchase Requirement Message 29016 | Purchase Requirement Message 29018 | | | | | | MDT: PurchaseRequirement Message 29020 |
| Purchase Requirement 29022 | | Purchase Requirement 29024 | | | | 1 29026 | PurchaseRequirement 29028 |
| | | | ID 29030 | | | 1 29032 | BusinessTransactionDocumentID 29034 |
| | | | Creation-Date Time 29036 | | | 1 29038 | DateTime 29040 |
| | | | Note 29042 | | | 0..1 29044 | Note 29046 |
| Party 29048 | | | BuyerParty 29054 | | | 0..1 29056 | BusinessTransactionDocumentParty 29058 |
| | | | | StandardID 29060 | | 0..n 29062 | PartyStandardID 29064 |

Fig. 290B

| | | | | | | |
|---|---|---|---|---|---|---|
| Purchase Requirement Message 29016 | | | | | | |
| Purchase Requirement 29022 | | | | | | |
| Party 29048 | | InternalID 29066 | | 0..1 29068 | PartyInternalID 29070 |
| | | Address 29072 | | 0..1 29074 | Address 29076 |
| | | ContactPerson 29078 | | 0..1 29080 | ContactPerson 29082 |
| | | | InternalID 29084 | 0..n 29086 | ContactPersonInternalID 29088 |
| | | | Address 29090 | 0..1 29092 | Address 29094 |
| | SellerParty 29096 | | | 0..1 29098 | BusinessTransactionDocumentParty 29000A |
| | ProposedSeller Party 29002A | | | 0..1 29004A | BusinessTransactionDocumentParty 29006A |
| | RequestorParty 29008A | | | 0..1 29010A | BusinessTransactionDocumentParty 29012A |
| | Product RecipientParty 29014A | | | 0..1 29016A | BusinessTransactionDocumentParty 29018A |

Fig. 290C

Purchase Requirement Message 29016

Purchase Requirement 29022

| | | | | |
|---|---|---|---|---|
| Party 29048 | ManufacturerParty 29020A | | 0..1 29022A | BusinessTransactionDocumentParty 29024A |
| Location 29050 | ShipToLocation 29026A | | 0..1 29028A | BusinessTransactionDocumentLocation 29030A |
| | | StandardID 29032A | 0..1 29034A | LocationStandardID 29036A |
| | | InternalID 29038A | 0..1 29040A | LocationStandardID 29042A |
| | | Address 29044A | 0..1 29046A | Address 29048A |
| | ShipFromLocation 29050A | | 0..1 29052A | BusinessTransactionDocumentLocation 29054A |
| Item 29052 | Item 29056A | | 1..n 29058A | PurchaseRequirementItem 29060A |
| | | ID 29062A | 1 29064A | BusinessTransactionDocumentItemID 29066A |
| | | ThirdPartyDeal Indicator 29068A | 0..1 29070A | BusinessTransactionDocumentItem ThirdPartyDealIndicator 29072A |
| | | DirectMaterial Indicator 29074A | 0..1 29076A | DirectMaterialIndicator 29078A |

Fig. 290D

| | | | | |
|---|---|---|---|---|
| Purchase Requirement Message 29016 | | | | |
| Purchase Requirement 29022 | | | | |
| Item 29052 | HierarchyRelationship 29080A | | 0..1 29082A | |
| | | ParentItemID 29084A | 1 29086A | BusinessTransactionDocumentItemID 29088A |
| | | TypeCode 29090A | 1 29092A | BusinessTransactionDocumentItem HierarchyRelationshipTypeCode 29094A |
| Product 29096A | Product 29012B | | 0..1 29014B | BusinessTransactionDocumentProduct 29016B |
| | | StandardID 29018B | 0..n 29020B | ProductStandardID 29022B |
| | | InternalID 29024B | 0..1 29026B | ProductInternalID 29028B |
| | | TypeCode 29030B | 0..1 29032B | ProductTypeCode 29034B |
| | | Note 29036B | 0..1 29038B | Note 29040B |
| | ProductCategory 29042B | | 0..1 29044B | BusinessTransactionDocumentProduct Category 29046B |

Fig. 290E

Purchase Requirement Message 29016

Purchase Requirement 29022

Item 29052

| | | | | |
|---|---|---|---|---|
| Product 29096A | | StandardID 29048B | 0..n 29050B | ProductCategoryStandardID 29052B |
| | | InternalID 29054B | 0..n 29056B | ProductCategoryInternalID 29058B |
| Price 29098A | Price 29060B | | 0..1 29062B | |
| | | NetUnitPrice 29064B | 0..1 29066B | Price 29068B |
| | ProcurementCostUpper Limit 29070B | | 0..1 29072B | ProcurementCostUpperLimit 29074B |
| Party 29000B | BuyerParty 29076B | | 0..1 29078B | BusinessTransactionDocumentParty 29080B |
| | SellerParty 29082B | | 0..1 29084B | BusinessTransactionDocumentParty 29086B |
| | ProposedSellerParty 29088B | | 0..1 29090B | BusinessTransactionDocumentParty 29092B |
| | RequestorParty 29094B | | 0..1 29096B | BusinessTransactionDocumentParty 29098B |

Fig. 290F

| | | | |
|---|---|---|---|
| Purchase Requirement Message 29016 | | | |
| Purchase Requirement 29022 | | | |
| Item 29052 | | | |
| Party 29000B | ProductRecipientParty 29000C | 0..1 29002C | BusinessTransactionDocumentParty 29004C |
| | ManufacturerParty 29006C | 0..1 29008C | BusinessTransactionDocumentParty 29010C |
| Location 29002B | ShipFromLocation 29012C | 0..1 29014C | BusinessTransactionDocumentLocation 29016C |
| | ShipToLocation 29018C | 0..1 29020C | BusinessTransactionDocumentLocation 29022C |
| BusinessTransaction DocumentReference 29004B | PurchaseContract Reference 29024C | 0..1 29026C | BusinessTransactionDocument Reference 29028C |
| | OriginPurchaseOrder Reference 29030C | 0..1 29032C | BusinessTransactionDocument Reference 29034C |
| Attachment 29006B | AttachmentWebAddress 29036C | 0..1 29038C | AttachmentWebAddress 29040C |
| Description 29008B | Description 29042C | 0..1 29044C | Description 29046C |
| | InternalDescription 29048C | 0..1 29050C | Description 29052C |

Fig. 290G

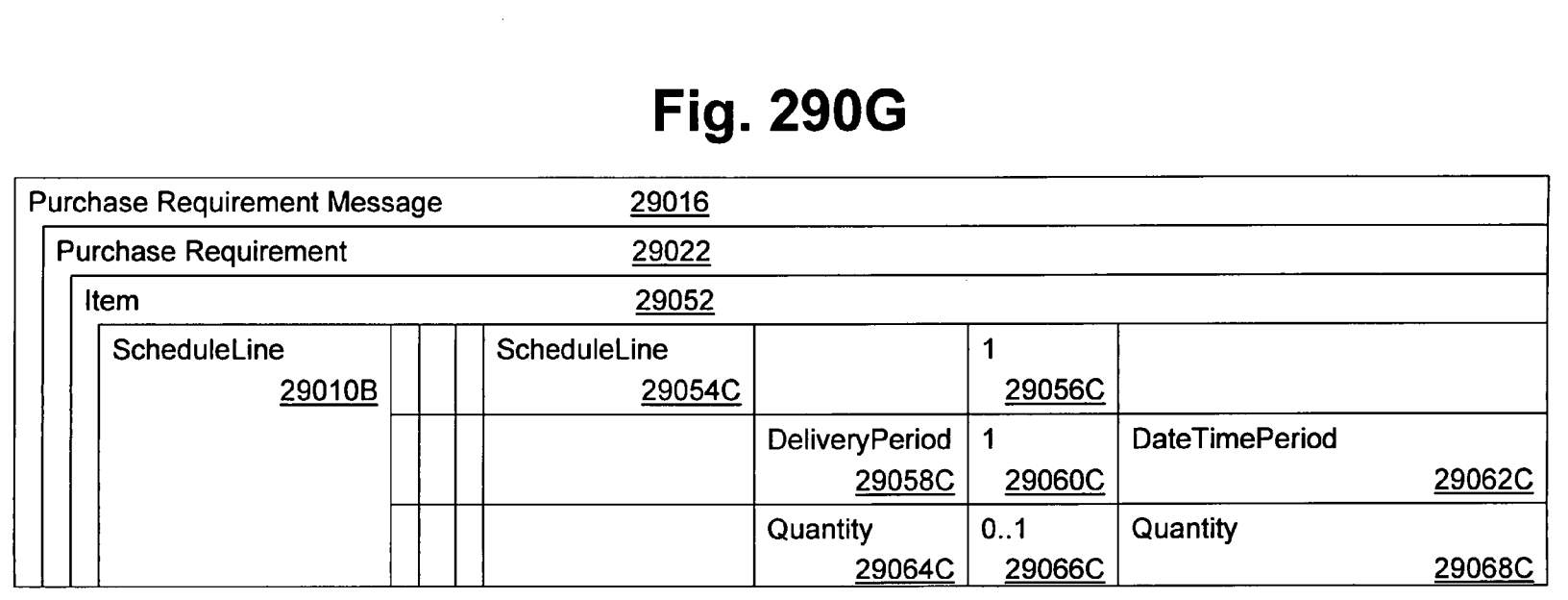

| | | | | |
|---|---|---|---|---|
| Purchase Requirement Message 29016 | | | | |
| Purchase Requirement 29022 | | | | |
| Item 29052 | | | | |
| ScheduleLine 29010B | ScheduleLine 29054C | | 1 29056C | |
| | | DeliveryPeriod 29058C | 1 29060C | DateTimePeriod 29062C |
| | | Quantity 29064C | 0..1 29066C | Quantity 29068C |

Fig. 293A

| Package 29300 | L1 29302 | L2 29304 | L3 29306 | L4 29308 | L5 29310 | L6 29312 | Occ. 29314 | SAP GDT 29316 |
|---|---|---|---|---|---|---|---|---|
| SourceOf Supply Message 29318 | Source Of Supply Message 29320 | | | | | | | MDT: SourceOfSupplyMessage 29322 |
| SourceOf Supply 29324 | | Source Of Supply 29326 | | | | | 1..n 29328 | GDT: SourceOfSupply 29330 |
| | | | Active Indicator 29332 | | | | 1 29334 | GDT: ActiveIndicator 29336 |
| | | | Deleted Indicator 29338 | | | | 1 29340 | GDT: Deleted Indicator 29342 |
| | | | Sourcing PriorityCode 29344 | | | | 0..1 29346 | GDT: BusinessTransaction PriorityCode 29348 |
| | | | ValidityPeriod 29350 | | | | 1 29352 | GDT: DateTimePeriod 29354 |
| | | | Target Quantity 29356 | | | | 0..1 29358 | GDT: Quantity 29360 |

Fig. 293B

| SourceOf Supply Message 29318 | | | | |
| --- | --- | --- | --- | --- |
| SourceOfSupply 29324 | TargetAmount 29362 | 0..1 29364 | GDT: Amount 29366 |
| | GoodsReceiptProcessing Duration 29368 | 0..1 29370 | GDT: Duration 29372 |
| | PlannedDeliveryDuration 29374 | 0..1 29376 | GDT: Duration 29378 |
| BusinessTransaction DocumentReference 29380 | PurchaseContractReference 29390 | 0..1 29392 | GDT: BusinessTransaction DocumentReference 29394 |
| | SchedulingAgreementReference 29396 | 0..1 29398 | GDT: BusinessTransaction DocumentReference 29300A |
| Party 29382 | BuyerParty 29302A | 0..1 29304A | GDT: BusinessTransaction DocumentParty 29306A |
| | SellerParty 29308A | 0..1 29310A | GDT: BusinessTransaction DocumentParty 29312A |
| Location 29384 | ShipToLocation 29314A | 0..n 29316A | GDT: BusinessTransaction DocumentLocation 29318A |

Fig. 293C

| | | | | | | | |
|---|---|---|---|---|---|---|---|
| Source Of Supply Message 29318 | | | | | | | |
| Source Of Supply 29324 | | | | | | | |
| Location 29384 | | ShipFrom Location 29320A | | | | 0..n 29322A | GDT: BusinessTransaction DocumentLocation 29324A |
| Product Information 29386 | | Product 29326A | | | | 0..1 29328A | GDT: BusinessTransaction DocumentProduct 29330A |
| | | Product Category 29332A | | | | 0..1 29334A | GDT: ProductCategory 29336A |
| Price Information 29388 | | Price 29338A | | | | 0..n 29340A | |
| | | | ShipToLocation 29342A | | | 0..1 29344A | GDT: BusinessTransaction DocumentLocation 29346A |
| | | | ValidityPeriod 29348A | | | 1 29350A | GDT: DateTimePeriod 29352A |
| | | | FixedCosts Amount 29354A | | | 0..1 29356A | GDT: Amount 29358A |
| | | | NetUnitPrice 29360A | | | 0..1 29362A | GDT: Price 29364A |

Fig.293D

| | | | | | |
|---|---|---|---|---|---|
| Source Of Supply Message 29318 | | | | | |
| Source Of Supply 29324 | | | | | |
| Price Information 29388 | Scale 29366A | | | 0..1 29368A | |
| | | AxisInterval Boundary Type Code 29370A | | 1 29372A | GDT: ScaleAxisInterval BoundaryTypeCode 29374A |
| | | Line 29376A | | 1..n 29378A | |
| | | | Quantity 29380A | 1 29382A | GDT: Quantity 29384A |
| | | | NetUnitPrice 29386A | 1 29388A | GDT: Price 29390A |

Fig. 297A

| Package 29700 | L1 29702 | L2 29704 | L3 29706 | L4 29708 | L5 29710 | L6 29712 | L7 29714 | Oc. 29716 | Type 29718 | Name 29720 |
|---|---|---|---|---|---|---|---|---|---|---|
| Purchase Order Message 29722 | Purchase Order Message 29724 | | | | | | | | MDT 29726 | Purchase Order Message 29728 |
| Message Header 29730 | | Message Header 29734 | | | | | | 1 29736 | AGDT 29738 | Business Document Message Header 29740 |
| | | | MessageID 29742 | | | | | 1 29744 | GDT 29746 | Business Document MessageID 29748 |
| | | | Reference ID 29750 | | | | | 0..1 29752 | GDT 29754 | Business Document MessageID 29756 |
| | | | Creation DateTime 29758 | | | | | 1 29760 | GDT 29762 | DateTime 29764 |

Fig. 297B

| PurchaseOrderMessage 29722 | | | | | | | | |
|---|---|---|---|---|---|---|---|---|
| Message Header 29730 | | Sender Party 29766 | | | 0..1 29768 | AGDT 29770 | BusinessDocument MessageHeaderParty 29772 |
| | | | InternalID 29774 | | 0..1 29776 | CDT 29778 | PartyInternalID 29780 |
| | | | StandardID 29782 | | 0..n 29784 | CDT 29786 | PartyStandardID 29788 |
| | | | Contact Person 29790 | | 0..1 29792 | CDT 29794 | ContactPerson 29796 |
| | | | | BuyerID 29798 | 0..1 29700A | CDT 29702A | ContactPersonPartyID 29704A |
| | | | | SellerID 29706A | 0..1 29708A | CDT 29710A | ContactPersonPartyID 29712A |
| | | | | Address 29714A | 0..1 29716A | AGDT 29718A | Address 29720A |
| | | Recipient Party 29722A | | | 0..n 29724A | AGDT 29726A | BusinessDocument MessageHeaderParty 29728A |
| Purchase Order 29732 | Purchase Order 29730A | | | | 1 29732A | AGDT 29734A | PurchaseOrder 29736A |

Fig. 297C

| PurchaseOrderMessage 29722 | | | | |
|---|---|---|---|---|
| Purchase Order 29732 | ID 29738A | 1 29740A | GDT 29742A | BusinessTransaction DocumentID 29744A |
| | SellerID 29746A | 0..1 29748A | GDT 29750A | BusinessTransaction DocumentID 29752A |
| | BuyerPostingDateTime 29754A | 0..1 29756A | GDT 29758A | DateTime 29760A |
| | BuyerLastChangeDate Time 29762A | 0..1 29764A | GDT 29766A | DateTime 29768A |
| | SellerPostingDateTime 29770A | 0..1 29772A | GDT 29774A | DateTime 29776A |
| | SellerLastChangeDate Time 29778A | 0..1 29780A | GDT 29782A | DateTime 29784A |
| | AcceptanceStatusCode 29786A | 0..1 29788A | GDT 29790A | AcceptanceStatusCode 29792A |
| | Note 29794A | 0..1 29796A | GDT 29798A | Note 29700B |

Fig. 297D

PurchaseOrderMessage 29722

| | | | | | | |
|---|---|---|---|---|---|---|
| Purchase Order 29732 | | ItemList Complete Transmission Indicator 29702B | | 0..1 29704B | GDT 29706B | Complete Transmission Indicator 29708B |
| | Party 29710B | BuyerParty 29726B | | 0..1 29728B | AGDT 29730B | BusinessTransaction DocumentParty 29732B |
| | | | StandardID 29734B | 0..n 29736B | CDT 29738B | PartyStandardID 29740B |
| | | | BuyerID 29742B | 0..1 29744B | CDT 29746B | PartyPartyID 29748B |
| | | | SellerID 29750B | 0..1 29752B | CDT 29754B | PartyPartyID 29756B |
| | | | Address 29758B | 0..1 29760B | AGDT 29762B | Address 29764B |
| | | | Contact Person 29766B | 0..1 29768B | CDT 29770B | ContactPerson 29772B |

Fig. 297E

| | | | | | |
|---|---|---|---|---|---|
| PurchaseOrderMessage 29722 | | | | | |
| PurchaseOrder 29732 | | | | | |
| Party 29710B | | BuyerID 29790B | 0..1 29792B | CDT 29794B | ContactPersonPartyID 29796B |
| | | SellerID 29798B | 0..1 29700C | CDT 29702C | ContactPersonPartyID 29704C |
| | | Address 29706C | 0..1 29708C | AGDT 29710C | Address 29712C |
| | SellerParty 29714C | | 0..1 29716C | AGDT 29720C | BusinessTransaction DocumentParty 29722C |
| | Product Recipient Party 29724C | | 0..1 29726C | AGDT 29728C | BusinessTransaction DocumentParty 29730C |
| | VendorParty 29732C | | 0..1 29734C | AGDT 29736C | BusinessTransaction DocumentParty 29738C |

Fig. 297F

| | | | | | | |
|---|---|---|---|---|---|---|
| PurchaseOrderMessage 29722 | | | | | | |
| PurchaseOrder 29732 | | | | | | |
| Party 29710B | ManufacturerParty 29740C | | 0..1 29742C | AGDT 29744C | BusinessTransactionDocumentParty 29746C |
| | BillToParty 29748C | | 0..1 29750C | AGDT 29752C | BusinessTransactionDocumentParty 29754C |
| | PayerParty 29756C | | 0..1 29758C | AGDT 29760C | BusinessTransactionDocumentParty 29762C |
| | CarrierParty 29764C | | 0..1 29766C | AGDT 29768C | BusinessTransactionDocumentParty 29770C |
| Location 29712B | ShipToLocation 29772C | | 0..1 29774C | AGDT 29776C | BusinessTransactionDocumentShipToLocation 29778C |
| | | StandardID 29780C | 0..n 29782C | CDT 29784C | LocationStandardID 29786C |
| | | BuyerID 29788C | 0..1 29790C | CDT 29792C | LocationPartyID 29794C |
| | | SellerID 29796C | 0..1 29798C | CDT 29700D | LocationPartyID 29702D |

Fig. 297G

PurchaseOrderMessage 29722

PurchaseOrder 29732

| | | | | | | |
|---|---|---|---|---|---|---|
| Location 29712B | | Address 29704D | | 0..1 29706D | AGDT 29708D | Address 29710D |
| | ShipFrom Location 29712D | | | 0..1 29714D | AGDT 29716D | BusinessTransactionDocumentShipFromLocation 29718D |
| Delivery Information 29714B | Delivery Terms 29720D | | | 0..1 29722D | AGDT 29724D | DeliveryTerms 29726D |
| | | Delivery ItemGroup ID 29728D | | 0..1 29730D | GDT 29732D | BusinessTransactionDocumentItemGroupID 29734D |
| | | Delivery Priority Code 29736D | | 0..1 29738D | GDT 29740D | BusinessTransactionPriorityCode 29742D |
| | | Incoterms 29744D | | 0..1 29746D | GDT 29748D | Incoterms 29750D |
| | | | Classification Code 29752D | 1 29754D | | |

Fig. 297H

PurchaseOrderMessage 29722

PurchaseOrder 29732

| | | | | | | |
|---|---|---|---|---|---|---|
| Delivery Information 29714B | | TransferLocation Name 29756D | 0..1 29758D | | |
| | Partial Delivery 29760D | | 0..1 29762D | AGDT 29764D | PartialDelivery 29766D |
| | | MaximalNumber 29768D | 0..1 29770D | | |
| | | Unlimited Indicator 29772D | 0..1 29774D | GDT 29776D | UnlimitedIndicator 29778D |
| | Quantity Tolerance 29780D | | 0..1 29782D | AGDT 29784D | QuantityTolerance 29786D |
| | | OverPercent 29788D | 0..1 29790D | GDT 29792D | Percent 29794D |
| | | OverPercent Unlimited Indicator 29796D | 0..1 29798D | GDT 29700E | UnlimitedIndicator 29702E |

Fig. 297I

| | | | | | | |
|---|---|---|---|---|---|---|
| PurchaseOrderMessage 29722 | | | | | | |
| PurchaseOrder 29732 | | | | | | |
| Delivery Information 29714B | | UnderPercent 29704E | 0..1 29706E | GDT 29708E | Percent 29710E |
| | Maximum LeadTime Duration 29712E | | 0..1 29714E | GDT 29716E | Duration 29718E |
| | Transport 29720E | | 0..1 29722E | | |
| | | ServiceLevel Code 29724E | 0..1 29726E | GDT 29728E | TransportServiceLevel Code 29730E |
| | | ModeCode 29732E | 0..1 29734E | GDT 29736E | TransportModeCode 29738E |
| | | Means DescriptionCode 29740E | 0..1 29742E | GDT 29744E | TransportMeans DescriptionCode 29746E |
| | Description 29748E | | 0..1 29750E | GDT 29752E | Description 29754E |
| | | LanguageCode 29756E | 1 29757E | | |

Fig. 297J

PurchaseOrderMessage 29722

PurchaseOrder 29732

| | | | | | | |
|---|---|---|---|---|---|---|
| Delivery Information 29714B | Cash Discount Terms 29758E | | | 0..1 29760E | AGDT 29762E | CashDiscount Terms 29764E |
| | | PaymentBase LineDate 29766E | | 0..1 29768E | GDT 29770E | Date 29772E |
| | | MaximumCash Discount 29774E | | 0..1 29776E | GDT 29778E | CashDiscount 29780E |
| | | | DaysValue 29782E | 1 29783E | | |
| | | | Percent 29784E | 1 29785E | GDT 29786E | Percent 29788E |
| | | NormalCash Discount 29790E | | 0..1 29792E | GDT 29794E | CashDiscount 29796E |
| | | | DaysValue 29798E | 1 29700F | | |

Fig. 297K

| | | | | | | |
|---|---|---|---|---|---|---|
| PurchaseOrderMessage 29722 | | | | | | |
| PurchaseOrder 29732 | | | | | | |
| Delivery Information 29714B | | | Percent 29702F | 1 29704F | GDT 29706F | Percent 29708F |
| | | FullPayment DueDays Value 29710F | | 0..1 29712F | | |
| Payment Information 16B | Payment Form 29714F | | | 0..1 29716F | | |
| | | Code 29718F | | 1 29720F | GDT 29722F | PaymentFormCode 29724F |
| | | Payment Card 29726F | | 0..1 29728F | AGDT 29730F | PaymentCard 29732F |
| | | | ID 29734F | 1 29736F | GDT 29738F | PaymentCardID 29740F |
| | | | ReferenceID 29742F | 0..1 29744F | | |
| | | | SequenceID 29746F | 0..1 29748F | | |

Fig. 297L

PurchaseOrderMessage 29722

PurchaseOrder 29732

| | | | | | | |
|---|---|---|---|---|---|---|
| Payment Information 16B | | | Holder 29750F | 0..1 29752F | | |
| | | | Expiration Date 29754F | 1 29756F | GDT 29758F | Date 29760F |
| Attachment 29718B | Attachment 29762F | | | 0..n 29764F | GDT 29766F | Attachment 29768F |
| | | ID 29770F | | 1 29772F | | |
| | | Filename 29774F | | 0..1 29776F | | |
| Description 29720B | Description 29778F | | | 0..1 29780F | GDT 29782F | Description 29784F |
| | | LanguageCode 29786F | | 1 29788F | | |
| | Confirmation Description 29790F | | | 0..1 29792F | GDT 29794F | Description 29796F |
| | | LanguageCode 29798F | | 1 29700G | | |

Fig. 297M

| | | | | | |
|---|---|---|---|---|---|
| PurchaseOrderMessage 29722 | | | | | |
| PurchaseOrder 29732 | | | | | |
| FollowUp Business Transaction Document 29722B | FollowUpPurchase OrderConfirmation 29702G | | 0..1 29704G | | |
| | | Requirement Code 29706G | 1 29708G | GDT 29710G | FollowUpMessage RequirementCode 29712G |
| | FollowUpDespatched DeliveryNotification 29714G | | 0..1 29716G | | |
| | | Requirement Code 29718G | 1 29720G | GDT 29722G | FollowUpMessage RequirementCode 29724G |
| | FollowUpService Acknowledgement Request 29726G | | 0..1 29728G | | |

Fig. 297N

| | | | | | |
|---|---|---|---|---|---|
| PurchaseOrderMessage 29722 | | | | | |
| PurchaseOrder 29732 | | | | | |
| FollowUp Business Transaction Document 29722B | | Requirement Code 29734G | 1 29736G | GDT 29738G | FollowUpMessage RequirementCode 29740G |
| | FollowUp Invoice Request 29742G | | 0..1 29744G | | |
| | | Requirement Code 29746G | 1 29748G | GDT 29750G | FollowUpMessage RequirementCode 29752G |
| | | Evaluated Receipt Settlement Indicator 29754G | 0..1 29756G | GDT 29758G | EvaluatedReceiptSettlement Indicator 29760G |
| Item 29724B | Item 29762G | | 0..n 29764G | AGDT 29766G | PurchaseOrderItem 29768H |
| | | ID 29770G | 0..1 29772G | GDT 29774G | BusinessTransaction DocumentItemID 29776G |
| | | SellerID 29778G | 0..1 29780G | GDT 29782G | BusinessTransaction DocumentItemID 29784G |

Fig. 297O

| | | | | |
|---|---|---|---|---|
| PurchaseOrderMessage 29722 | | | | |
| PurchaseOrder 29732 | | | | |
| Item 29724B | | | | |
| ActionCode 29786G | | 1 29788G | GDT 29790G | ActionCode 29792G |
| AcceptanceStatus Code 29794G | | 0..1 29796G | GDT 29798G | AcceptanceStatusCode 29700H |
| UnplannedItem PermissionCode 29702H | | 0..1 29704H | GDT 29706H | UnplannedItem PermissionCode 29708H |
| Hierarchy Relationship 29710H | | 0..1 29712H | | |
| | ParentItemID 29714H | 0..1 29716H | GDT 29718H | BusinessTransaction DocumentItemID 29720H |
| | ParentItem SellerID 29722H | 0..1 29724H | GDT 29726H | BusinessTransaction DocumentItemID 29728H |
| | TypeCode 29730H | 1 29732H | GDT 29734H | BusinessTransaction DocumentItemHierarchy RelationshipTypeCode 29736H |

Fig. 297P

| | | | | | |
|---|---|---|---|---|---|
| PurchaseOrderMessage 29722 | | | | | |
| PurchaseOrder 29732 | | | | | |
| Item 29724B | | | | | |
| Product Information 29738H | Product 29750H | | 0..1 29751H | GDT 29752H | BusinessTransaction DocumentProduct 29753H |
| | | StandardID 29754H | 0..n 29755H | CDT 29756H | ProductStandardID 29757H |
| | | BuyerID 29758H | 0..1 29759H | CDT 29760H | ProductPartyID 29761H |
| | | SellerID 29762H | 0..1 29763H | CDT 29764H | ProductPartyID 29765H |
| | | ManufacturerID 29766H | 0..1 29768H | CDT 29770H | ProductPartyID 29772H |
| | | TypeCode 29774H | 0..1 29776H | GDT 29778H | ProductTypeCode 29780H |
| | | Note 29782H | 0..1 29784H | GDT 29786H | Note 29788H |
| | Product Category 29790H | | 0..1 29792H | GDT 29794H | BusinessTransaction DocumentProductCategory 29796H |
| | | StandardID 29798H | 0..n 29700I | CDT 29702I | ProductCategoryStandardID 29704I |

Fig. 297Q

PurchaseOrderMessage 29722

PurchaseOrder 29732

Item 29724B

| | | | | | | | | | |
|---|---|---|---|---|---|---|---|---|---|
| Product Information 29738H | | | | | BuyerID 29706I | | | 0..1 29708I | CDT 29710I | ProductCategory PartyID 29712I |
| | | | | | SellerID 29714I | | | 0..1 29716I | CDT 29718I | ProductCategory PartyID 29720I |
| Price Information 29740H | | | | Price 29722I | | | | 0..1 29724I | | |
| | | | | | NetUnitPrice 29726I | | | 0..1 29728I | AGDT 29730I | Price 29732I |
| | | | | | | Amount 29734I | | 1 29736I | GDT 29738I | Amount 29740I |
| | | | | | | | Currency Code 29742I | 1 | | |
| | | | | | | Base Quantity 29744I | | 1 29746I | GDT 29748I | Quantity 29750I |

Fig. 297R

PurchaseOrderMessage 29722

PurchaseOrder 29732

Item 29724B

| | | | | | | | |
|---|---|---|---|---|---|---|---|
| Price Information 29740H | | | | UnitCode 29752I | 1 29754I | | |
| | Confirmed Price 29756I | | | | 0..1 29758I | | |
| | | NetUnit Price 29760I | | | 0..1 29762I | AGDT 29764I | Price 29766I |
| | | | Amount 29768I | | 1 29770I | GDT 29772I | Amount 29774I |
| | | | | Currency Code 29776I | 1 29778I | | |
| | | | Base Quality 29782I | | 1 29784I | GDT 29786I | Quantity 29788I |
| | | | | UnitCode 29790I | 1 29792I | | |

Fig. 297S

| | | | | |
|---|---|---|---|---|
| PurchaseOrderMessage 29722 | | | | |
| PurchaseOrder 29732 | | | | |
| Item 29724D | | | | |
| Party 29736H | BuyerParty 29794I | 0..1 29796I | AGDT 29798I | BusinessTransactionDocumentParty 29700J |
| | SellerParty 29702J | 0..1 29704J | AGDT 29706J | BusinessTransactionDocumentParty 29708J |
| | Product RecipientParty 29710J | 0..1 29712J | AGDT 29714J | BusinessTransactionDocumentParty 29716J |
| | VendorParty 29718J | 0..1 29720J | AGDT 29722J | BusinessTransactionDocumentParty 29724J |
| | Manufacturer Party 29726J | 0..1 29728J | AGDT 29730J | BusinessTransactionDocumentParty 29732J |
| | BillToParty 29734J | 0..1 29736J | AGDT 29738J | BusinessTransactionDocumentParty 29740J |
| | PayerParty 29742J | 0..1 29744J | AGDT 29746J | BusinessTransactionDocumentParty 29748J |
| | CarrierParty 29750J | 0..1 29752J | AGDT 29754J | BusinessTransactionDocumentParty 29756J |

Fig. 297T

| | | | | | |
|---|---|---|---|---|---|
| PurchaseOrderMessage 29722 | | | | | |
| PurchaseOrder 29732 | | | | | |
| Item 29724D | | | | | |
| Location 29738H | ShipTo Location 29758J | | 0..1 29760J | AGDT 29762J | BusinessTransactionDocumentShipToLocation 29764J |
| | ShipFrom Location 29766J | | 0..1 29768J | AGDT 29770J | BusinessTransactionDocumentShipFromLocation 29772J |
| Delivery Information 29740H | Delivery Terms 29774J | | 0..1 29776J | AGDT 29778J | DeliveryTerms 29780J |
| Business Transaction Document Reference 29742H | Quote Reference 29782J | | 0..1 29784J | AGDT 29786J | BusinessTransactionDocument Reference 29788J |
| | | ID 29790J | 1 29792J | GDT 29794J | BusinessTransactionDocumentID 29796J |
| | | ItemID 29798J | 0..n 29700K | GDT 29702K | BusinessTransactionDocumentItem ID 29704K |
| | Purchase Contract Reference 29706K | | 0..n 29708K | AGDT 29710K | BusinessTransactionDocument Reference 29712K |

Fig. 297U

| | | | | | |
|---|---|---|---|---|---|
| PurchaseOrderMessage 29722 | | | | | |
| PurchaseOrder 29732 | | | | | |
| Item 29724D | | | | | |
| Business Transaction Document Reference 29742H | | ID 29714K | 1 29716K | GDT 29718K | BusinessTransactionDocumentID 29720K |
| | | ItemID 29722K | 0..n 29724K | GDT 29726K | BusinessTransactionDocumentItemID 29728K |
| | Sales Contract Reference 29730K | | 0..n 29732K | AGDT 29734K | BusinessTransactionDocumentReference 29736K |
| | | ID 29738K | 1 29740K | GDT 29742K | BusinessTransactionDocumentID 29744K |
| | | ItemID 29746K | 0..n 29748K | GDT 29750K | BusinessTransactionDocumentItemID 29752K |
| | Origin Purchase Order Reference 29754K | | 0..1 29756K | AGDT 29758K | BusinessTransactionDocumentReference 29760K |
| | | ID 29762K | 1 29764K | GDT 29766K | BusinessTransactionDocumentID 29768K |

Fig. 297V

| | | | | | |
|---|---|---|---|---|---|
| PurchaseOrderMessage 29722 | | | | | |
| PurchaseOrder 29732 | | | | | |
| Item 29724D | | | | | |
| Business Transaction Document Reference 29742H | | ItemID 29770K | 0..n 29772K | GDT 29774K | BusinessTransaction DocumentItemID 29776K |
| | BuyerProduct Catalogue Reference 29778K | | 0..1 29780K | AGDT 29782K | CatalogueReference 29784K |
| | | ID 29786K | 1 29788K | GDT 29790K | CatalogueID 29792K |
| | | ItemID 29794K | 0..n 29796K | GDT 29798K | CatalogueItemID 29700L |
| | SellerProduct Catalogue Reference 29702L | | 0..1 29704L | AGDT 29706L | CatalogueReference 29708L |
| | | ID 29710L | 1 29712L | GDT 29714L | CatalogueID 29716L |
| | | ItemID 29718L | 0..n 29720L | GDT 29722L | CatalogueItemID 29724L |

Fig. 297W

| | | | | | | | | | |
|---|---|---|---|---|---|---|---|---|---|
| PurchaseOrderMessage 29722 | | | | | | | | | |
| PurchaseOrder 29732 | | | | | | | | | |
| Item 29724D | | | | | | | | | |
| Attachment 29744H | | | Attachment 29726L | | | | 0..n 29728L | AGDT 29732L | Attachment 29734L |
| Description 29746H | | | Description 29736L | | | | 0..1 29738L | GDT 29740L | Description 29742L |
| | | | | Language Code 29744L | | | 1 29746L | | |
| | | | Confirmation Description 29748L | | | | 0..1 29750L | GDT 29752L | Description 29754L |
| | | | | Language Code 29756L | | | 1 29758L | | |
| Schedule Line 29748H | | | ScheduleLine 29760L | | | | 0..n 29762L | AGDT 29764L | PurchaseOrderItem ScheduleLine 29766L |
| | | | | ID 29768L | | | 0..1 29770L | GDT 29772L | BusinessTransaction DocumentItem ScheduleLineID 29774L |

Fig. 297X

PurchaseOrderMessage 29722

PurchaseOrder 29732

Item 29724D

| | | | | | |
|---|---|---|---|---|---|
| Schedule Line 29748H | SellerID 29776L | | 0..1 29778L | GDT 29780L | BusinessTransactionDocumentItemScheduleLineID 29782L |
| | Delivery Period 29784L | | 1 29786L | AGDT 29788L | DateTimePeriod 29790L |
| | | StartDate Time 29792L | 0..1 29794L | GDT 29796L | DateTime 29798L |
| | | EndDate Time 29700M | 0..1 29702M | GDT 29704M | DateTime 29706M |
| | | Duration 29708M | 0..1 29710M | GDT 29712M | Duration 29714M |
| | Quantity 29716M | | 0..1 29718M | GDT 29720M | Quantity 29722M |
| | | UnitCode 29724M | 1 29726M | | |

Fig. 300A

| Package 30000 | L1 30002 | L2 30004 | L3 30006 | L4 30008 | L5 30010 | Card 30012 | Type 30014 | DTN 30016 | PIDEX 30018 |
|---|---|---|---|---|---|---|---|---|---|
| Service Acknowledge-mentMessage 30020 | Service Acknow-ledgement Message 30022 | | | | | | MDT 30024 | Service Acknowledge-mentMessage 30026 | |
| Message Header 30028 | | Message Header 30032 | | | | 1 30034 | AGDT 30036 | Business Document MessageHeader 30038 | |
| | | | ID 30040 | | | 1 30042 | GDT 30044 | Business Document MessageID 30046 | |
| | | | ReferenceID 30048 | | | 0..1 30050 | GDT 30052 | Business Document MessageID 30054 | |
| | | | Creation DateTime 30056 | | | 1 30058 | GDT 30060 | DateTime 30062 | |
| | | | SenderParty 30064 | | | 0..1 30066 | AGDT 30068 | BusinessDocu-mentMessage HeaderParty 30070 | |

Fig. 300B

ServiceAcknowledgementMessage 30020

| | | | | | | | |
|---|---|---|---|---|---|---|---|
| Message Header 30028 | | | InternalID 30072 | | 0..1 30074 | CDT 30076 | PartyInternalID 30078 |
| | | | StandardID 30080 | | 0..n 30082 | CDT 30084 | PartyStandardID 30086 |
| | | | Contract Person 30088 | | 0..1 30090 | AGDT 30092 | ContactPerson 30094 |
| | | | | BuyerID 30096 | 0..1 30098 | CDT 30000A | ContactPersonParty ID 30002A |
| | | | | VendorID 30004A | 0..1 30006A | CDT 30008A | ContactPersonParty ID 30010A |
| | | | | Address 30012A | 0..1 30014A | AGDT 30016A | Address 30018A |
| | | Recipient Party 30020A | | | 0..n 30022A | AGDT 30024A | BusinessDocument MessageHeaderParty 30026A |
| Service Acknow-Ledgement 30030 | Service Acknow-ledgement 30028A | | | | 1 30030A | AGDT 30032A | Service Acknowledgement 30034A |

Fig. 300C

| ServiceAcknowledgementMessage 30020 | | | | | | |
|---|---|---|---|---|---|---|
| Service Acknow-ledgement 30030 | ID 30036A | | 1 30038A | GDT 30040A | BusinessTrans-actionDocumentID 30042A | FieldTicketProperties-FieldTicketNumber 30044A |
| | BuyerID 30046A | | 0..1 30048A | GDT 30050A | BusinessTrans-actionDocumentID 30052A | |
| | Creation DateTime 30054A | | 0..1 30056A | GDT 30058A | DateTime 30060A | FieldTicketProperties-FieldTicketDate 30062A |
| | Acceptance StatusCode 30064A | | 0..1 30066A | GDT 30068A | AcceptanceStatus Code 30070A | FieldTicketResponse LineItem-LineStatus Code 30072A |
| | Note 30074A | | 0..1 30076A | GDT 30078A | Note 30080A | |
| Party 30082A | BuyerParty 30092A | | 0..1 30094A | AGDT 30096A | BusinessTransac-tionDocumentParty 30098A | PartnerInformation (all Parties) 30000B |
| | | StandardID 30002B | 0..n 30004B | CDT 30006B | PartyStandardID 30008B | |

Fig. 300D

ServiceAcknowledgementMessage 30020

ServiceAcknowledgement 30030

| | | | | | | |
|---|---|---|---|---|---|---|
| Party 30082A | | BuyerID 30010B | | 0..1 30012B | CDT 30014B | PartyPartyID 30016B | |
| | | SellerID 30018B | | 0..1 30020B | CDT 30022B | PartyPartyD 30024B | |
| | | Address 30026B | | 0..1 30028B | AGDT 30030B | Address 30032B | |
| | | Contract Person 30034B | | 0..1 30036B | AGDT 30038B | ContactPerson 30040B | |
| | | | BuyerID 30042B | 0..1 30044B | CDT 30046B | ContactPersonPartyID 30048B | |
| | | | SellerID 30050B | 0..1 30052B | CDT 30054B | ContactPersonPartyID 30056B | |
| | | | Address 30058B | 0..1 30060B | AGDT 30062B | Address 30064B | |
| | Seller Party 30066B | | | 0..1 30068B | AGDT 30070B | BusinessTransaction DocumentParty 30072B | Partner Information 30074B |

Fig. 300E

ServiceAcknowledgementMessage 30020

ServiceAcknowledgement 30030

| | | | | | | |
|---|---|---|---|---|---|---|
| Party 30082A | Product Recipient Party 30076B | | 0..1 30078B | AGDT 30080B | BusinessTransaction DocumentParty 30082B | PartnerInformation 30084B |
| | Vendor Party 30086B | | 0..1 30088B | AGDT 30090B | BusinessTransaction DocumentParty 30092B | PartnerInformation and partially CountryOfOrigin 30094B |
| | Manufacture rParty 30096B | | 0..1 30098B | AGDT 30000C | BusinessTransaction DocumentParty 30002C | PartnerInformation 30004C |
| Location 30084A | ShipTo Location 30006C | | 0..1 30008C | AGDT 30010C | BusinessTransaction DocumentLocation 30012C | partially : Country OfFinalDestination 30014C |
| | | StandardID 30016C | 0..n 30018C | CDT 30020C | LocationStandardID 30022C | |
| | | BuyerID 30024C | 0..1 30026C | CDT 30028C | LocationPartyID 30030C | |
| | | SellerID 30032C | 0..1 30034C | CDT 30036C | LocationPartyID 30038C | |
| | | Address 30040C | 0..1 30042C | AGDT 30044C | Address 30046C | |
| Attach-ment 30086A | Attachment 30048C | | 0..n 30050C | AGDT 30052C | Attachment 30054C | FieldTicketProperties -Attachment 30056C |

Fig. 300F

| | | | | | | |
|---|---|---|---|---|---|---|
| ServiceAcknowledgementMessage 30020 | | | | | | |
| ServiceAcknowledgement 30030 | | | | | | |
| Description 30088A | Description 30058C | | 0..1 30060C | GDT 30062C | Description 30064C | FieldTicket Properties-Comment and - JobSummary 30066C |
| | Confirmation Description 30068C | | 0..1 30070C | GDT 30072C | Description 30074C | |
| Item 30090A | Item 30076C | | 0..n 30078C | AGDT 30080C | Service Acknowledgement Item 30082C | |
| | | ID 30084C | 1 30086C | GDT 30088C | Business Transaction DocumentItemID 30090C | FieldTicket LineItem-LineItem Number 30092C |
| | | BuyerID 30094C | 0..1 30096C | GDT 30098C | Business Transaction DocumentItemID 30000D | |

Fig. 300G

ServiceAcknowledgementMessage 30020

ServiceAcknowledgement 30030

| | | | | | | |
|---|---|---|---|---|---|---|
| Item 30090A | ServiceEntry Completed Indicator 30002D | | 0..1 30004D | GDT 30006D | Business Transaction CompletedID 30008D | |
| | Delivery Period 30010D | | 0..1 30012D | GDT 30014D | DateTimePeriod 30016C | FieldTicketLineItem-ServiceDateTime 30018D |
| | Quantity 30020D | | 0..1 30022D | GDT 30024D | Quantity 30026D | FieldTicketProperties-FieldTicketQuantity 30028D |
| | Hierarchy Relationship 30030D | | 0..1 30032D | | | realized with FieldTicket SubLineItem 30034D |
| | | ParentItem ID 30036D | 0..1 30038D | GDT 30040D | Business Transaction DocumentItem ID 30042D | |

Fig. 300H

| | | | | | | | | | | |
|---|---|---|---|---|---|---|---|---|---|---|
| ServiceAcknowledgementMessage 30020 | | | | | | | | | | |
| | ServiceAcknowledgement 30030 | | | | | | | | | |
| | | Item 30090A | | | | | ParentItem BuyerID 30044D | 0..1 30046D | GDT 30048D | BusinessTransaction DocumentItemID 30050D |
| | | | | | | | TypeCode 30052D | 1 30054D | GDT 30056D | BusinessTransaction DocumentItem HierarchyRelationship TypeCode 30058D |

Fig. 300I

| | | | | | | |
|---|---|---|---|---|---|---|
| ServiceAcknowledgementMessage 30020 | | | | | | |
| ServiceAcknowledgement 30030 | | | | | | |
| Item 30090A | | | | | | |
| Product Information 30060D | Product 30074D | | 0..1 30076D | AGDT 30078D | Business Transaction DocumentProduct 30080D | FieldTicketProperties-LineItem Information 30082D |
| | | StandardID 30084D | 0..n 30086D | CDT 30088D | ProductStandardID 30090D | |
| | | BuyerID 30092D | 0..1 30094D | CDT 30096D | ProductPartyID 30098D | |
| | | SellerID 30000E | 0..1 30002E | CDT 30004E | ProductPartyID 30006E | |
| | | Manufacturer ID 30008E | 0..1 30010E | CDT 30012E | ProductPartyID 30014E | |
| | | TypeCode 30016E | 0..1 30018E | GDT 30020E | ProductTypeCode 30022E | |
| | | Note 30024E | 0..1 30026E | GDT 30028E | Note 30030E | |
| | Product Category 30032E | | 0..1 30034E | AGDT 30036E | Business Transaction DocumentProduct Category 30038E | |

Fig. 300J

| | | | | | | |
|---|---|---|---|---|---|---|
| ServiceAcknowledgementMessage 30020 | | | | | | |
| ServiceAcknowledgement 30030 | | | | | | |
| Item 30090A | | | | | | |
| Product Information 30060D | | Standard ID 30040E | 0..n 30042E | CDT 30044E | ProductCategory StandardID 30046E | |
| | | BuyerID 30048D | 0..1 30050E | CDT 30052E | ProductCategory PartyID 30054E | |
| | | SellerID 30056E | 0..1 30058E | CDT 30060E | ProductCategory PartyID 30062E | |
| Price Information 30062D | Price 30064E | | 0..1 30066E | | | FieldTicketLine Item-Pricing 30068E |
| | | NetUnit Price 30070E | 0..1 30072E | AGDT 30074E | Price 30076E | partially: PrimaryCurrency 30078E |
| Party 30064D | Buyer Party 30080E | | 0..1 30082E | AGDT 30084E | BusinessTransaction DocumentParty 30086E | PartnerInformation 30088E |
| | Seller Party 30090E | | 0..1 30092E | AGDT 30094E | BusinessTransaction DocumentParty 30096E | PartnerInformation 30098E |

Fig. 300K

| | | | | | |
|---|---|---|---|---|---|
| ServiceAcknowledgementMessage | 30020 | | | | |
| ServiceAcknowledgement | 30030 | | | | |
| Item | 30090A | | | | |
| Party 30064D | ProductRecipient Party 30000F | 0..1 30002F | AGDT 30004F | BusinessTransaction DocumentParty 30006F | PartnerInformation 30008F |
| | VendorParty 30010F | 0..1 30012F | AGDT 30014F | BusinessTransaction DocumentParty 30016F | PartnerInformation and partially– CountryOfOrigin 30018F |
| | Manufacturer Party 30020F | 0..1 30022F | AGDT 30024F | BusinessTransaction DocumentParty 30026F | PartnerInformation 30028F |
| Location 30066D | ShipToLocation 30030F | 0..1 30032F | AGDT 30034F | BusinessTransaction DocumentLocation 30036F | |
| Business Transaction Document Reference 30068D | PurchaseOrder Reference 30038F | 0..1 30040F | AGDT 30042F | BusinessTransaction DocumentReference 30044F | FieldTicketLineItem-PurchaseOrder Information 30046F |
| | Purchase Contract Reference 30048F | 0..1 30050F | AGDT 30052F | BusinessTransaction DocumentReference 30054F | FieldTicketLineItem-Reference Information 30056F |

Fig. 300L

| | | | | | |
|---|---|---|---|---|---|
| ServiceAcknowledgementMessage 30020 | | | | | |
| ServiceAcknowledgement 30030 | | | | | |
| Item 30090A | | | | | |
| Business Transaction Document Reference 30068D | SalesContract Reference 30058F | 0..1 30060F | AGDT 30062F | BusinessTransaction DocumentReference 30064F | |
| | BuyerProduct Catalogue Reference 30066F | 0..1 30068F | AGDT 30070F | CatalogueReference 30072F | |
| | SellerProduct Catalogue Reference 30074F | 0..1 30076F | AGDT 30078F | CatalogueReference 30080F | |
| Attachment 30070D | Attachment 30082F | 0..n 30084F | AGDT 30086F | Attachment 30088F | FieldTicketLineItem-Attachment 30090F |
| Description 30072D | Description 30092F | 0..1 30094F | GDT 30096F | Description 30098F | FieldTicketLineItem-Comment and JobSummary 30000G |
| | Confirmation Description 30002G | 0..1 30004G | GDT 30006G | Description 30008G | |

Fig. 306A

| Package 30600 | L 1 30602 | L2 30604 | L3 30606 | L4 30608 | L5 30610 | L6 30612 | Occ 30614 | Type 30616 | Name 30618 |
|---|---|---|---|---|---|---|---|---|---|
| RFQMessage 30620 | RFQ Message 30622 | | | | | | | MDT 30624 | RFQMessage 30626 |
| Message Header 30628 | | Message Header 30632 | | | | | 1 30634 | AGDT 30636 | BusinessDocument MessageHeader 30638 |
| | | | ID 30640 | | | | 1 30642 | GDT 30644 | BusinessDocument MessageID 30646 |
| | | | Reference ID 30648 | | | | 0..1 30650 | GDT 30652 | BusinessDocument MessageID 30654 |
| | | | Creation DateTime 30656 | | | | 1 30658 | GDT 30660 | DateTime 30662 |
| | | | Sender Party 30664 | | | | 0..1 30666 | AGDT 30668 | BusinessDocument MessageHeader Party 30670 |
| | | | | InternalID 30672 | | | 0..1 30674 | CDT 30676 | PartyInternalID 30678 |

Fig. 306B

| RFQMessage 30620 | | | | | | | |
|---|---|---|---|---|---|---|---|
| Message Header 30628 | | | StandardID 30680 | | 0..n 30682 | CDT 30684 | PartyStandardID 30686 |
| | | | Contact Person 30688 | | 0..1 30690 | AGDT 30692 | ContactPerson 30694 |
| | | | | Internal ID 30696 | 0..n 30698 | CDT 30600A | ContactPerson InternalID 30602A |
| | | | | BuyerID 30604A | 0..1 30606A | CDT 30608A | ContactPersonPartyID 30610A |
| | | | | BidderID 30612A | 0..1 30614A | CDT 30616A | ContactPersonPartyID 30618A |
| | | | | Address 30620A | 0..1 30622A | AGDT 30624A | Address 30626A |
| | | RecipientParty 30628A | | | 0..n 30630A | AGDT 30632A | BusinessDocument MessageHeaderParty 30634A |
| RFQ 30630 | RFQ 30636A | | | | 1 30638A | AGDT 30640A | RFQ 30642A |
| | | ID 30644A | | | 1 30646A | GDT 30648A | BusinessTransaction DocumentID 30650A |

Fig. 306C

RFQMessage 30620

| | | | | | | | | | |
|---|---|---|---|---|---|---|---|---|---|
| RFQ 30630 | | | PostingDateTime 30652A | | | | 0..1 30654A | GDT 30656A | DateTime 30658A |
| | | | LastChangeDateTime 30660A | | | | 0..1 30662A | GDT 30664A | DateTime 30666A |
| | | | PublishDateTime 30668A | | | | 0..1 30670A | GDT 30672A | DateTime 30674A |
| | | | DisplayDateTime 30676A | | | | 0..1 30678A | GDT 30680A | DateTime 30682A |
| | | | BiddingStartDateTime 30684A | | | | 0..1 30686A | GDT 30688A | DateTime 30690A |
| | | | QuoteSubmissionDateTime 30692A | | | | 1 30694A | GDT 30696A | DateTime 30698A |
| | | | QuoteOpeningDateTime 30600B | | | | 0..1 30602B | GDT 30604B | DateTime 30606B |
| | | | QuoteBindingDateTime 30608B | | | | 0..1 30610B | GDT 30612B | DateTime 30614B |
| | | | ContractValidityPeriod 30616B | | | | 0..1 30618B | GDT 30620B | DateTimePeriod 30622B |
| | | | Note 30624B | | | | 0..1 30626B | GDT 30628B | Note 30630B |

Fig. 306D

| RFQMessage 30620 | | | | | | |
|---|---|---|---|---|---|---|
| RFQ 30630 | | RFQPublicIndicator 30632B | | 1 30634B | GDT 30636B | BusinessTransaction DocumentPublicIndicator 30638B |
| | | QuoteUnplannedItem PermissionCode 30640B | | 0..1 30642B | GDT 30644B | UnplannedItemPermission Code 30646B |
| | | QuotePriceBidding ConditionCode 30648B | | 1 30650B | GDT 30652B | BiddingConditionCode 30654B |
| | | QuoteQuantityBidding ConditionCode 30656B | | 1 30658B | GDT 30660B | BiddingConditionCode 30662B |
| | | QuoteItemBidding ConditionCode 30664B | | 1 30666B | GDT 30668B | BiddingConditionCode 30670B |
| | | ContractTargetAmount 30672B | | 0..1 30674B | GDT 30676B | Amount 30678B |
| | Party 30680B | BuyerParty 30600C | | 0..1 30602C | AGDT 30604C | BusinessTransaction DocumentParty 30606C |

Fig. 306E

| | | | | | | |
|---|---|---|---|---|---|---|
| RFQMessage 30620 | | | | | | |
| RFQ 30630 | | | | | | |
| Party 30680B | | StandardID 30608C | | 0..n 30610C | CDT 30612C | PartyStandardID 30614C |
| | | BuyerID 30616C | | 0..1 30618C | CDT 30620C | PartyPartyID 30622C |
| | | BidderID 30624C | | 0..1 30626C | CDT 30628C | PartyPartyID 30630C |
| | | Address 30632C | | 0..1 30634C | AGDT 30636C | Address 30638C |
| | | ContactPerson 30640C | | 0..1 30642C | AGDT 30644C | ContactPerson 30646C |
| | | | BuyerID 30648C | 0..1 30650C | CDT 30652C | ContactPersonPartyID 30654C |
| | | | BidderID 30656C | 0..1 30658C | CDT 30660C | ContactPersonPartyID 30662C |
| | | | Address 30664C | 0..1 30666C | AGDT 30668C | Address 30670C |
| | BidderParty 30672C | | | 0..1 30674C | AGDT 30676C | BusinessTransaction DocumentParty 30678C |

Fig. 306F

| | | | | | |
|---|---|---|---|---|---|
| RFQMessage 30620 | | | | | |
| RFQ 30630 | | | | | |
| Party 30680B | BidderPortal ProviderParty 30680C | | 0..1 30682C | AGDT 30684C | BusinessTransactionDocument Party 30686C |
| | ProductReceipient Party 30688C | | 0..1 30690C | AGDT 30692C | BusinessTransactionDocument Party 30694C |
| | VendorParty 30696C | | 0..1 30698C | AGDT 30600D | BusinessTransactionDocument Party 30602D |
| | ManufacturerParty 30604D | | 0..1 30606D | AGDT 30608D | BusinessTransactionDocument Party 30610D |
| | PayerParty 30612D | | 0..1 30614D | AGDT 30616D | BusinessTransactionDocument Party 30618D |
| Location 30682B | ShipToLocation 30620D | | 0..1 30622D | AGDT 30624D | BusinessTransactionDocument Location 30626D |
| | | StandardID 30628D | 0..n 30630D | CDT 30632D | LocationStandardID 30634D |
| | | BuyerID 30636D | 0..1 30638D | CDT 30640D | LocationPartyID 30642D |

Fig. 306G

| | | | | | | |
|---|---|---|---|---|---|---|
| RFQMessage | | 30620 | | | | |
| RFQ | | 30630 | | | | |
| Location 30682B | | BidderID 30644D | | 0..1 30646D | CDT 30648D | LocationPartyID 30650D |
| | | Address 30652D | | 0..1 30654D | AGDT 30656D | Address 30658D |
| Delivery Information 30684B | DeliveryTerms 30660D | | | 0..1 30662D | AGDT 30664D | DeliveryTerms 30666D |
| | | Incoterms 30668D | | 0..1 30670D | GDT 30672D | Incoterms 30674D |
| Payment Information 30686B | CashDiscount Terms 30676D | | | 0..1 30678D | AGDT 30680D | CashDiscountTerms 30682D |
| | | MaximumCashDiscount 30684D | | 0..1 30686D | GDT 30688D | CashDiscount 30690D |
| | | NormalCashDiscount 30692D | | 0..1 30694D | GDT 30696D | CashDiscount 30698D |
| | | FullPaymentDueDays Value 30600E | | 0..1 30602E | | |
| | PaymentForm 30604E | | | 0..1 30606E | | |

Fig. 306H

RFQMessage 30620

RFQ 30630

| | | | | | |
|---|---|---|---|---|---|
| Payment Information 30686B | | Code 30608E | 1 30610E | GDT 30612E | PaymentFormCode 30614E |
| Product Information 30688B | Product Category 30616E | | 0..1 30618E | GDT 30620E | BusinessTransactionDocument Product Category 30622E |
| | | Standard ID 30624E | 0..n 30626E | CDT 30628E | ProductCategoryStandardID 30630E |
| | | BuyerID 30632E | 0..1 30634E | CDT 30636E | ProductCategoryPartyID 30638E |
| | | Bidder ID 30640E | 0..1 30642E | CDT 30644E | ProductCategoryPartyID 30646E |
| Business Transaction Document Reference 30690B | Quote Reference 30648E | | 0..1 30650E | GDT 30652E | BusinessTransactionDocument Reference 30654E |
| | | ID 30656E | 1 30658E | GDT 30660E | BusinessTransactionDocument ID 30662E |

Fig. 306I

| | | | | | |
|---|---|---|---|---|---|
| RFQMessage 30620 | | | | | |
| RFQ 30630 | | | | | |
| FollowUp Business Transaction Document 30692B | FollowUp Purchase Order 30664E | | 0..1 30666E | | |
| | | Requirement Code 30668E | 1 30670E | GDT 30672E | FollowUpBusinessTransaction DocumentRequirementCode 30674E |
| | FollowUp Purchase Document 30676E | | 0..1 30678E | | |
| | | Requirement Code 30680E | 1 30682E | GDT 30684E | FollowUpBusinessTransaction DocumentRequirementCode 30686E |
| Attachment 30694B | Attachment 30688E | | 0..n 30690E | GDT 30692E | Attachment 30694E |
| Description 30696B | Description 30696E | | 0..1 30698E | GDT 30600F | Description 30602F |
| Item 30698B | Item 30604F | | 0..n 30606F | AGDT 30608F | RFQItem 30610F |

Fig. 306J

| | | | | | |
|---|---|---|---|---|---|
| RFQMessage 30620 | | | | | |
| RFQ 30630 | | | | | |
| Item 30698B | ID 30612F | | 1 30614F | GDT 30616F | BusinessTransactionDocument ItemID 30618F |
| | Contract TargetAmount 30620F | | 0..1 30622F | GDT 30624F | Amount 30626F |
| | Hierarchy Relationship 30628F | | 0..1 30630F | | |
| | | ParentItemID 30632F | 1 30634F | GDT 30636F | BusinessTransactionDocument ItemID 30638F |
| | | TypeCode 30640F | 1 30642F | GDT 30644F | BusinessTransationDocument ItemHierarchyRelationshipType Code 30646F |
| Product Information 30648F | Product 30664F | | 0..1 30666F | GDT 30668F | BusinessTransactionDocument Product 30670F |
| | | StandardID 30672F | 0..n 30674F | CDT 30676F | ProductStandardID 30678F |

Fig. 306K

| | | | | | |
|---|---|---|---|---|---|
| RFQMessage | | 30620 | | | |
| RFQ | | 30630 | | | |
| Item | | 30698B | | | |
| Product Information 30648F | | BuyerID 30680F | 0..1 30682F | CDT 30684F | ProductPartyID 30686F |
| | | BidderID 30688F | 0..1 30690F | CDT 30692F | ProductPartyID 30694F |
| | | Manufacturer ID 30696F | 0..1 30698F | CDT 30600G | ProductPartyID 30602G |
| | | TypeCode 30604G | 0..1 30606G | GDT 30608G | ProductTypeCode 30610G |
| | | Note 30612G | 0..1 30614G | GDT 30616G | Note 30618G |
| | Product Category 30620G | | 0..1 30622G | GDT 30624G | BusinessTransactionDocument Product 30626G |
| | | StandardID 30628G | 0..n 30630G | CDT 30632G | ProductCategoryStandardID 30634G |
| | | BuyerID 30636G | 0..1 30638G | CDT 30640G | ProductCategoryPartyID 30642G |

Fig. 306L

| | | | | | | |
|---|---|---|---|---|---|---|
| RFQMessage 30620 | | | | | | |
| RFQ 30630 | | | | | | |
| Item 30698B | | | | | | |
| Product Information 30648F | | BidderID 30644G | 0..1 30646G | CDT 30648G | ProductCategoryPartyID 30650G |
| Party 30650F | BuyerParty 30652G | | 0..1 30654G | AGDT 30656G | BusinessTransactionDocument Party 30658G |
| | BidderParty 30660G | | 0..1 30662G | AGDT 30664G | BusinessTransactionDocument Party 30666G |
| | ProductRecipient Party 30668G | | 0..1 30670G | AGDT 30672G | BusinessTransactionDocument Party 30674G |
| | VendorParty 30676G | | 0..1 30678G | AGDT 30680G | BusinessTransactionDocument Party 30682G |
| | ManufacturerParty 30684G | | 0..1 30686G | AGDT 30688G | BusinessTransactionDocument Party 30690G |
| Location 30652F | ShipToLocation 30692G | | 0..1 30694G | AGDT 30696G | BusinessTransactionDocument Location 30698G |

Fig. 306M

| | | | | | | |
|---|---|---|---|---|---|---|
| RFQMessage 30620 | | | | | | |
| RFQ 30630 | | | | | | |
| Item 30698B | | | | | | |
| Location 30652F | | StandardID 30600H | 0..n 30602H | CDT 30604H | LocationStandardID 30606H |
| | | BuyerID 30608H | 0..1 30610H | CDT 30612H | LocationPartyID 30614H |
| | | BidderID 30616H | 0..1 30618H | CDT 30620H | LocationPartyID 30622H |
| | | Address 30624H | 0..1 30626H | AGDT 30628H | Address 30630H |
| DeliveryInformation 30654F | DeliveryTerms 30632H | | 0..1 30634H | AGDT 30636H | DeliveryTerms 30638H |
| | | MaximumLead TimeDuration 30640H | 0..1 30642H | GDT 30644H | Duration 30646H |
| | | Incoterms 30648H | 0..1 30650H | GDT 30652H | Incoterms 30654H |
| BusinessTransaction Document Reference 30656F | Quote Reference 30656H | | 0..1 30658H | GDT 30660H | BusinessTransaction Document Reference 30662H |

Fig. 306N

| | | | | | | |
|---|---|---|---|---|---|---|
| RFQMessage 30620 | | | | | | |
| RFQ 30630 | | | | | | |
| Item 30698B | | | | | | |
| Business Transaction Document Reference 30656F | | ID 30664H | 1 30666H | GDT 30668H | BusinessTransactionDocumentID 30670H |
| | | ItemID 30672H | 0..n 30674H | GDT 30676H | BusinessTransactionDocument ItemID 30678H |
| | PurchaseContract Reference 30680H | | 0..1 30682H | GDT 30684H | BusinessTransactionDocument Reference 30686H |
| | | ID 30688H | 1 30690H | GDT 30692H | BusinessTransactionDocumentID 30694H |
| | | ItemID 30696H | 0..n 30698H | GDT 30600I | BusinessTransactionDocument ItemID 30602I |
| | BuyerProduct Catalogue Reference 30604I | | 0..1 30606I | AGDT 30608I | CatalogueReference 30610I |
| | | ID 30612I | 1 30614I | GDT 30616I | CatalogueID 30618I |

Fig. 306O

| | | | | | | |
|---|---|---|---|---|---|---|
| RFQMessage 30620 | | | | | | |
| RFQ 30630 | | | | | | |
| Item 30698B | | | | | | |
| Business Transaction Document Reference 30656F | | ItemID 30620I | 0..n 30622I | GDT 30624I | CatalogueItemID 30626I |
| Attachment 30658F | Attachment 30628I | | 0..n 30630I | GDT 30632I | Attachment 30634I |
| Description 30660F | Description 30636I | | 0..1 30638I | GDT 30640I | Description 30642I |
| Schedule Line 30662F | ScheduleLine 30644I | | 0..1 30646I | AGDT 30648I | RFQItemScheduleLine 30650I |
| | | ID 30652I | 0..1 30654I | GDT 30656I | BusinessTransactionDocumentItemScheduleLineID 30658I |
| | | Delivery Period 30660I | 1 30662I | AGDT 30664I | DateTimePeriod 30666I |
| | | Quantity 30668I | 0..1 30670I | GDT 30672I | Quantity 30674I |

Fig. 307A

| Package 30700 | L1 30702 | L2 30704 | L3 30706 | L4 30708 | L5 30710 | Card 30712 | Type 30714 | Name 30716 |
|---|---|---|---|---|---|---|---|---|
| RFQ Cancellation Message 30718 | RFQ Cancellation Message 30720 | | | | | | MDT 30722 | RFQCancelation Message 30724 |
| Message Header 30726 | | Message Header 30730 | | | | 1 30732 | AGDT 30734 | BusinessDocument MessageHeader 30736 |
| | | | ID 30738 | | | 1 30740 | GDT 30742 | BusinessDocument MessageID 30744 |
| | | | ReferenceID 30746 | | | 0..1 30748 | GDT 30750 | BusinessDocument MessageID 30752 |
| | | | Creation DateTime 30754 | | | 1 30756 | GDT 30758 | DateTime 30760 |
| | | | SenderParty 30762 | | | 0..1 30764 | AGDT 30766 | BusinessDocument MessageHeaderParty 30768 |

Fig. 307B

| RFQ Cancellation Message | | | | 30718 | | | | |
|---|---|---|---|---|---|---|---|---|
| Message Header 30726 | | | | InternalID 30770 | | 0..1 30772 | CDT 30774 | PartyInternalID 30776 |
| | | | | Standard ID 30778 | | 0..n 30780 | CDT 30782 | PartyStandardID 30784 |
| | | | | Contact 30786 | | 0..1 30788 | GDT 30790 | ContactPerson 30792 |
| | | | | | Internal ID 30794 | 0..n 30796 | CDT 30798 | ContactPerson InternalID 30700A |
| | | | | | BuyerID 30702A | 0..1 30704A | CDT 30706A | ContactPersonPartyID 30708A |
| | | | | | BidderID 30710A | 0..1 30712A | CDT 30714A | ContactPersonPartyID 30716A |
| | | | | | Address 30718A | 0..1 30720A | AGDT 30722A | Address 30724A |
| | | | Recipient Party 30726A | | | 0..n 30728A | AGDT 30730A | BusinessDocument MessageHeaderParty 30732A |

Fig. 307C

| RFQ Cancellation Message 30718 | | | | | | | | |
|---|---|---|---|---|---|---|---|---|
| RFQ Cancellation 30728 | | RFQCancellation 30734A | | | | 1 30736A | GDT 30738A | RFQCancellation 30740A |
| | | | ID 30742A | | | 1 30744A | GDT 30746A | BusinessTransactionDocumentID 30748A |

Fig. 308A

| Package 30800 | L. 1 30802 | L. 2 30804 | L. 3 30806 | L. 4 30808 | L. 5 30810 | L. 6 30812 | Card 30814 | Type 30816 | Name 30818 |
|---|---|---|---|---|---|---|---|---|---|
| Quote Message 30820 | Quote Message 30822 | | | | | | | MDT 30824 | QuoteMessage 30826 |
| Message Header 30828 | | Message Header 30832 | | | | | 1 30834 | AGDT 30836 | Business Document MessageHeader 30838 |
| | | | ID 30840 | | | | 1 30842 | GDT 30844 | Business Document MessageID 30846 |
| | | | Reference ID 30848 | | | | 0..1 30850 | GDT 30852 | Business Document MessageID 30854 |
| | | | Creation DateTime 30856 | | | | 1 30858 | GDT 30860 | DateTime 30862 |
| | | | SenderParty 30864 | | | | 0..1 30866 | AGDT 30868 | Business Document MessageHeader Party 30870 |

Fig. 308B

| QuoteMessage 30820 | | | | | | | |
|---|---|---|---|---|---|---|---|
| Message Header 30828 | | | InternalID 30872 | | 0..1 30874 | CDT 30876 | PartyInternalID 30878 |
| | | | StandardID 30880 | | 0..n 30882 | CDT 30884 | PartyStandardID 30886 |
| | | | Contact 30888 | | 0..1 30890 | GDT 30892 | ContactPerson 30894 |
| | | | | InternalID 30896 | 0..n 30898 | CDT 30800A | ContactPersonInternalID 30802A |
| | | | | BuyerID 30804A | 0..1 30806A | CDT 30808A | ContactPersonPartyID 30810A |
| | | | | BidderID 30812A | 0..1 30814A | CDT 30816A | ContactPersonPartyID 30818A |
| | | | | Address 30820A | 0..1 30822A | AGDT 30824A | Address 30826A |
| | | Recipient Party 30828A | | | 0..n 30830A | AGDT 30832A | BusinessDocument MessageHeaderParty 30834A |
| Quote 30830 | Quote 30836A | | | | 1 30838A | AGDT 30840A | Quote 30842A |
| | | ID 30844A | | | 1 30846A | GDT 30848A | BusinessTransaction DocumentID 30850A |

Fig. 308C

| QuoteMessage 30820 | | | | | | |
|---|---|---|---|---|---|---|
| Quote 30830 | | PostingDateTime 30852A | | 0..1 30854A | GDT 30856A | DateTime 30858A |
| | | LastChangeDateTime 30860A | | 0..1 30862A | GDT 30864A | DateTime 30866A |
| | | BindingDateTime 30868A | | 0..1 30870A | GDT 30872A | DateTime 30874A |
| | | Note 30876A | | 0..1 30878A | GDT 30880A | Note 30882A |
| | | ContractTargetAmount 30884A | | 0..1 30886A | GDT 30888A | Amount 30890A |
| | Party 30892A | BuyerParty 30810B | | 0..1 30812B | AGDT 30814B | BusinessTransactionDocument Party 30816B |
| | | | StandardID 30818B | 0..n 30820B | CDT 30822B | PartyStandardID 30824B |
| | | | BuyerID 30826B | 0..1 30828B | CDT 30830B | PartyPartyID 30832B |
| | | | BidderID 30834B | 0..1 30836B | CDT 30838B | PartyPartyID 30840B |

Fig. 308D

| | | | | | | |
|---|---|---|---|---|---|---|
| QuoteMessage 30820 | | | | | | |
| Quote 30830 | | | | | | |
| Party 30892A | | Address 30842B | | 0..1 30844B | AGDT 30846B | Address 30848B |
| | | Contact 30850B | | 0..1 30852B | GDT 30854B | ContactPerson 30856B |
| | | | BuyerID 30858B | 0..1 30860B | CDT 30862B | PartyPartyID 30864B |
| | | | BidderID 30866B | 0..1 30868B | CDT 30870B | PartyPartyID 30872B |
| | | | Address 30874B | 0..1 30876B | AGDT 30878B | Address 30880B |
| | BidderParty 30882B | | | 0..1 30884B | AGDT 30886B | BusinessTransaction Document Party 30888B |
| | BidderPortal ProviderParty 30890B | | | 0..1 30892B | AGDT 30894B | BusinessTransaction DocumentParty 30896B |
| | ProductRecipient Party 30898B | | | 0..1 30800C | AGDT 30802C | BusinessTransaction DocumentParty 30804C |

Fig. 308E

| | | | | | |
|---|---|---|---|---|---|
| QuoteMessage 30820 | | | | | |
| Quote 30830 | | | | | |
| Party 30892A | VendorParty 30806C | | 0..1 30808C | AGDT 30810C | BusinessTransactionDocument Party 30812C |
| | ManufacturerParty 30814C | | 0..1 30816C | AGDT 30818C | BusinessTransactionDocument Party 30820C |
| | PayerParty 30822C | | 0..1 30824C | AGDT 30826C | BusinessTransactionDocument Party 30828C |
| Location 30894A | ShipToLocation 30830C | | 0..1 30832C | AGDT 30834C | BusinessTransactionDocument Location 30836C |
| | | StandardID 30838C | 0..n 30840C | CDT 30842C | LocationStandardID 30844C |
| | | BuyerID 30846C | 0..1 30848C | CDT 30850C | LocationPartyID 30852C |
| | | BidderID 30854C | 0..1 30856C | CDT 30858C | LocationPartyID 30860C |
| | | Address 30862C | 0..1 30864C | AGDT 30866C | Address 30868C |

Fig. 308F

| | | | | | |
|---|---|---|---|---|---|
| QuoteMessage | | 30820 | | | |
| Quote | | 30830 | | | |
| Delivery Information 30896A | DeliveryTerms 30870C | | 0..1 30872C | AGDT 30874C | DeliveryTerms 30876C |
| | | Incoterms 30878C | 0..1 30880C | GDT 30882C | Incoterms 30884C |
| Payment Information 30898A | CashDiscountTerms 30886C | | 0..1 30888C | AGDT 30890C | CashDiscountTerms 30892C |
| | | MaximumCash Discount 30894C | 0..1 30896C | GDT 30898C | CashDiscount 30800D |
| | | NormalCash Discount 30802D | 0..1 30804D | GDT 30806D | CashDiscount 30808D |
| | | FullPaymentDue DaysValue 30810D | 0..1 30812D | | |
| | PaymentForm 30814D | | 0..1 30816D | | |
| | | Code 30818D | 1 30820D | GDT 30822D | PaymentFormCode 30824D |

Fig. 308G

QuoteMessage 30820

Quote 30830

| | | | | | |
|---|---|---|---|---|---|
| Product Information 30800B | Product Category 30826D | | 0..1 30828D | GDT 30830D | BusinessTransaction DocumentProductCategory 30832D |
| | | StandardID 30834D | | CDT 30836D | ProductCategoryStandardID 30838D |
| | | BuyerID 30840D | | CDT 30842D | ProductCategoryPartyID 30844D |
| | | BidderID 30846D | | CDT 30848D | ProductCategoryPartyID 30850D |
| Business Transaction Document Reference 30802B | RFQReference 30852D | | 0..1 30854D | GDT 30856D | BusinessTransaction DocumentReference 30858D |
| | | ID 30860D | 1 30862D | GDT 30864D | BusinessTransaction DocumentID 30866D |
| Attachment 30804B | Attachment 30868D | | 0..n 30870D | GDT 30872D | Attachment 30874D |
| Description 30806B | Description 30876D | | 0..1 30878D | GDT 30880D | Description 30882D |
| Item 30808B | Item 30884D | | 0..n 30886D | AGDT 30888D | QuoteItem 30890D |

Fig. 308H

| | | | | | |
|---|---|---|---|---|---|
| QuoteMessage 30820 | | | | | |
| Quote 30830 | | | | | |
| Item 30808B | ID 30892D | | 1 30894D | GDT 30896D | BusinessTransaction DocumentItemID 30898D |
| | ContractTarget Amount 30800E | | 0..1 30802E | GDT 30804E | Amount 30806E |
| | Hierarchy Relationship 30808E | | 0..1 30810E | | |
| | | ParentItemID 30812E | 1 30814E | GDT 30816E | BusinessTransaction DocumentItemID 30818E |
| | | TypeCode 30820E | 1 30822E | GDT 30824E | BusinessTransaction DocumentItemHierarchy RelationshipTypeCode 30826E |
| Product Information 30828E | Product 30846E | | 0..1 30848E | | BusinessTransaction DocumentProduct 30850E |
| | | StandardID 30852E | 0..n 30854E | CDT 30856E | ProductStandardID 30858E |

Fig. 308I

| | | | | | |
|---|---|---|---|---|---|
| QuoteMessage 30820 | | | | | |
| Quote 30830 | | | | | |
| Item 30808B | | | | | |
| Product Information 30828E | | | | | |
| | | BuyerID 30860E | 0..1 30862E | CDT 30864E | ProductPartyID 30866E |
| | | BidderID 30868E | 0..1 30870E | CDT 30872E | ProductPartyID 30874E |
| | | ManufacturerID 30876E | 0..1 30878E | CDT 30880E | ProductPartyID 30882E |
| | | TypeCode 30884E | 0..1 30886E | GDT 30888E | ProductTypeCode 30890E |
| | | Note 30892E | 0..1 30894E | GDT 30896E | Note 30898E |
| | Product Category 30800F | | 0..1 30802F | | BusinessTransaction DocumentProduct 30804F |
| | | StandardID 30806F | 0..n 30808F | CDT 30810F | ProductCategory StandardID 30812F |
| | | BuyerID 30814F | 0..1 30816F | CDT 30818F | ProductCategoryPartyID 30820F |

Fig. 308J

| | | | | | |
|---|---|---|---|---|---|
| QuoteMessage | 30820 | | | | |
| Quote | 30830 | | | | |
| Item | 30808B | | | | |
| Product Information 30828E | | BidderID 30822F | | CDT 30824F | ProductCategoryPartyID 30826F |
| Price Information 30830E | Price 30828F | | 0..1 30830F | | |
| | | NetUnitPrice 30832F | 0..1 30834F | AGDT 30836F | Price 30838F |
| Party 30832E | BuyerParty 30840F | | 0..1 30842F | AGDT 30844F | BusinessTransactionDocument Party 30846F |
| | BidderParty 30848F | | 0..1 30850F | AGDT 30852F | BusinessTransactionDocument Party 30854F |
| | Product Recipient Party 30856F | | 0..1 30858F | AGDT 30860F | BusinessTransactionDocument Party 30862F |
| | VendorParty 30864F | | 0..1 30866F | AGDT 30868F | BusinessTransactionDocument Party 30870F |

Fig. 308K

QuoteMessage 30820

Quote 30830

Item 30808B

| | | | | | |
|---|---|---|---|---|---|
| Party 30832E | Manufacturer Party 30872F | | 0..1 30874F | AGDT 30876F | BusinessTransaction DocumentParty 30878F |
| Location 30834E | ShipToLocation 30880F | | 0..1 30882F | AGDT 30884F | BusinessTransaction DocumentLocation 30886F |
| | | StandardID 30888F | 0..n 30890F | CDT 30892F | LocationStandardID 30894F |
| | | BuyerID 30896F | 0..1 30898F | CDT 30800G | LocationPartyID 30802G |
| | | BidderID 30804G | 0..1 30806G | CDT 30808G | LocationPartyID 30810G |
| | | Address 30812G | 0..1 30814G | AGDT 30816G | Address 30818G |
| Delivery Information 30836E | DeliveryTerms 30820G | | 0..1 30822G | AGDT 30824G | DeliveryTerms 30826G |
| | | MaximumLead TimeDuration 30828G | 0..1 30830G | GDT 30832G | Duration 30834G |

Fig. 308L

| | | | | | |
|---|---|---|---|---|---|
| QuoteMessage 30820 | | | | | |
| Quote 30830 | | | | | |
| Item 30808B | | | | | |
| Delivery Information 30836E | | Incoterms 30836G | 0..1 30838G | GDT 30840G | Incoterms 30842G |
| Business Transaction Document Reference 30838E | RFQ Reference 30844G | | 0..1 30846G | GDT 30848G | BusinessTransaction DocumentReference 30850G |
| | | ID 30852G | 1 30854G | GDT 30856G | BusinessTransaction DocumentID 30858G |
| | | ItemID 30860G | 0..n 30862G | GDT 30864G | BusinessTransaction DocumentItemID 30866G |
| Attachment 30840E | Attachment 30868G | | 0..n 30870G | GDT 30872G | Attachment 30874G |
| Description 30842E | Description 30876G | | 0..1 30878G | GDT 30880G | Description 30882G |
| Schedule Line 30844E | Schedule Line 30884G | | 0..1 30886G | AGDT 30888G | QuoteItemScheduleLine 30890G |

Fig. 308M

| | | | | |
|---|---|---|---|---|
| QuoteMessage 30820 | | | | |
| Quote 30830 | | | | |
| Item 30808B | | | | |
| Schedule Line 30844E | ID 30892G | 0..1 30894G | GDT 30896G | BusinessTransaction DocumentItemScheduleLineID 30898G |
| | Delivery Period 30800H | 1 30802H | AGDT 30804H | DateTimePeriod 30806H |
| | Quantity 30808H | 0..1 30810H | GDT 30812H | Quantity 30814H |

Fig. 309A

| Package 30900 | L1 30902 | L2 30904 | L3 30906 | L4 30908 | L5 30910 | L6 30912 | Card 30914 | Type 30916 | Name 30918 |
|---|---|---|---|---|---|---|---|---|---|
| RFQResult Message 30920 | RFQResult Message 30922 | | | | | | | MDT 30924 | RFQResultMessage 30926 |
| Message Header 30928 | | Message Header 30932 | | | | | 1 30934 | AGDT 30936 | BusinessDocument MessageHeader 30938 |
| | | | ID 30940 | | | | 1 30942 | GDT 30944 | BusinessDocument MessageID 30946 |
| | | | Reference ID 30948 | | | | 0..1 30950 | GDT 30952 | BusinessDocument MessageID 30954 |
| | | | Creation DateTime 30956 | | | | 1 30958 | GDT 30960 | DateTime 30962 |
| | | | Sender Party 30964 | | | | 0..1 30966 | AGDT 30968 | BusinessDocument MessageHeader Party 30970 |

Fig. 309B

RFQResultMessage 30920

| | | | | | | |
|---|---|---|---|---|---|---|
| Message Header 30928 | | InternalID 30972 | | 0..1 30974 | CDT 30976 | PartyInternalID 30978 |
| | | StandardID 30980 | | 0..n 30982 | CDT 30984 | PartyStandardID 30986 |
| | | Contact 30988 | | 0..1 30990 | GDT 30992 | ContactPerson 30994 |
| | | | InternalID 30996 | 0..n 30998 | CDT 30900A | ContactPersonInternalID 30902A |
| | | | BuyerID 30904A | 0..1 30906A | CDT 30908A | ContactPersonPartyID 30910A |
| | | | BidderID 30912A | 0..1 30914A | CDT 30916A | ContactPersonPartyID 30918A |
| | | | Address 30920A | 0..1 30922A | AGDT 30924A | Address 30926A |
| | Recipient Party 30928A | | | 0..n 30930A | AGDT 30932A | BusinessDocumentMessage HeaderParty 30934A |

Fig. 309C

RFQResultMessage 30920

| | | | | | | | |
|---|---|---|---|---|---|---|---|
| RFQ Result 30930 | RFQ Result 30936A | | | | 1 30938A | AGDT 30940A | RFQResult 30942A |
| | | ID 30944A | | | 1 30946A | GDT 30948A | BusinessTransaction DocumentID 30950A |
| Party 30952A | | Bidder Party 30958A | | | 0..1 30960A | AGDT 30962A | BusinessTransaction DocumentParty 30964A |
| Descrip-tion 30954A | | Description 30966A | | | 0..1 30968A | GDT 30970A | Description 30972A |
| Item 30956A | | Item 30974A | | | 0..n 30976A | AGDT 30978A | RFQResultItem 30980A |
| | | | ID 30982A | | 1 30984A | GDT 30986A | BusinessTransaction DocumentItemID 30988A |
| | | | Hierarchy Relationship 30990A | | 0..1 30992A | | |
| | | | | Parent ItemID 30994A | 1 30996A | GDT 30998A | BusinessTransaction DocumentItemID 30900B |

Fig. 309D

| | | | | | | |
|---|---|---|---|---|---|---|
| RFQResultMessage 30920 | | | | | | |
| RFQResult 30930 | | | | | | |
| Item 30956A | | | TypeCode 30902B | 1 30904B | GDT 30906B | BusinessTransactionDocumentItemHierarchyRelationshipTypeCode 30908B |
| | Business Trans-action Document Reference 30910B | Quote Reference 30914B | | 0..1 30916B | GDT 30918B | BusinessTransactionDocumentReference 30920B |
| | | | ID 30922B | 1 30924B | GDT 30926B | BusinessTransactionDocumentID 30928B |
| | | | ItemID 30930B | 0..n 30932B | GDT 30934B | BusinessTransactionDocumentItemID 30936B |
| | Schedule Line 30912B | ScheduleLine 30938B | | 0..1 30940B | AGDT 30942B | RFQResultItemScheduleLine 30944B |
| | | | ID 30946B | 0..1 30948B | GDT 30950B | BusinessTransactionDocumentItemScheduleLineID 30952B |
| | | | Delivery Period 30954B | 1 30956B | AGDT 30958B | DateTimePeriod 30960B |
| | | | Quantity 30962B | 0..1 30964B | GDT 30966B | Quantity 30968B |

Fig. 318

| GDT | Object Class | Property | Rep. / Assoc. | Type | Type Name | Len. |
|---|---|---|---|---|---|---|
| BusinessTransaction DocumentItemProcessing TypeCode 31800 | Business Transaction Document Item 31802 | Processing Type 31804 | Code 31806 | CCT 31808 | Code 31810 | 1..4 31812 |

Fig. 319

| GDT | Object Class | Property | Rep. / Assoc. | Type | Type Name | Len. |
|---|---|---|---|---|---|---|
| BusinessTransaction DocumentProcessing TypeCode 31900 | Business Transaction Document 31902 | Processing Type 31904 | Code 31906 | CCT 31908 | Code 31910 | 1..4 31912 |

Fig. 320

| GDT | Property | Rep. / Assoc. | Type | Type Name | Len. |
|---|---|---|---|---|---|
| CancellationReasonCode 32000 | Cancellation Reason 32002 | Code 32004 | CCT 32006 | Code 32008 | 1..4 32010 |

Fig. 321

| GDT | Property | Rep. / Assoc. | Type | Type Name |
|---|---|---|---|---|
| CashDiscountDeductibleIndicator 32100 | CashDiscountDeductible 32102 | Indicator 32104 | CCT 32106 | Indicator 32108 |

Fig. 322

| GDT | Object Class | Property | Rep. / Assoc. | Type | Type Name | Len. | Remarks |
|---|---|---|---|---|---|---|---|
| CustomsCommodity ClassificationCode 32200 | Customs 32202 | Commodity Classification 32204 | Code 32206 | CCT 32208 | Code 32210 | 4..11 32212 | Restricted 32214 |

Fig. 323

| GDT | Object Class | Property | Rep. / Assoc. | Type | Type Name | Len. | Remarks |
|---|---|---|---|---|---|---|---|
| CustomsPreferential Statement StatusCode 32300 | Customs 32302 | Preferential Statement Status 32304 | Code 32306 | CCT 32308 | Code 32310 | 2 32312 | Restricted 32314 |

Fig. 324

| GDT | Object Class | Property | Rep. / Assoc. | Type | Type Name | Len. |
|---|---|---|---|---|---|---|
| DeliveryTypeCode 32400 | Delivery 32402 | Type 32404 | Code 32406 | CCT 32408 | Code 32410 | 4 32412 |

Fig. 325

| GDT | Cat. | Object Class | Property | Rep. / Assoc. | Type | Type Name |
|---|---|---|---|---|---|---|
| DueClearingIndicator 32500 | E 32502 | Due 32504 | Clearing 32506 | Indicator 32508 | CCT 32510 | Indicator 32512 |

Fig. 326

| CDT | | Cat. | Obj. Class | Property | Rep./ Assoc. | Type | Type Name | Len. | Card. | Remarks |
|---|---|---|---|---|---|---|---|---|---|---|
| Kanban CardID 32600 | | | Kanban Card 32602 | Identification 32604 | Identifier 32606 | CCT 32608 | Identifier 32610 | 1..10 32612 | | Restric-ted 32614 |
| | scheme AgencyID 32616 | A 32618 | Identification Scheme Agency 32620 | | Identifier 32622 | xsd 32624 | token 32626 | 1..60 32628 | 0..1 32630 | Optional 32632 |

Fig. 327

| CDT | | Cat. | Obj. Class | Property Qualifier | Property | Rep./ Assoc. | Type | Type Name | Card. |
|---|---|---|---|---|---|---|---|---|---|
| Log 32700 | | | Log 32702 | | | Details 32704 | | | |
| | MaximumLogItem SeverityCode 32706 | E 32708 | Log 32710 | Maximum 32712 | LogItem Severity 32714 | Code 32716 | GDT 32718 | LogItem SeverityCode 32720 | 0..1 32722 |
| | Item 32724 | E 32726 | Log 32728 | | Item 32730 | Details 32732 | GDT 32734 | LogItem 32736 | 1..n 32738 |

Fig. 328

| GDT | Property | Rep. / Assoc. | Type | Type Name |
|---|---|---|---|---|
| NaturalPersonIndicator 32800 | Natural Person 32802 | Indicator 32804 | CCT 32806 | Indicator 32808 |

Fig. 329

| GDT | Object Class | Property | Rep. / Assoc. | Type | Type Name | Len. | Remarks |
|---|---|---|---|---|---|---|---|
| PackingListID 32900 | Packing List 32902 | Identification 32904 | Identifier 32906 | CCT 32908 | Identifier 32910 | 1..35 32912 | restricted 32914 |

Fig. 330

| GDT | | Cat. | Obj. Class | Prop. Qual. | Property | Rep./ Assoc. | Type | Type Name | Len. | Card. | Remarks |
|---|---|---|---|---|---|---|---|---|---|---|---|
| Party TaxID 33000 | | | Party 33002 | Tax 33004 | Identification 33006 | Identifier 33008 | CCT 33010 | Identifier 33012 | 1..20 33014 | | restricted 33016 |
| | scheme ID 33018 | A 33020 | Identification Scheme 33022 | | Identification 33024 | Identifier 33026 | xsd 33028 | token 33030 | 3..4 33032 | 1 33034 | |

Fig. 331a

| GDT | | Cat. | Obj. Class | Property | Rep./ Assoc. | Type | Type Name | Card. |
|---|---|---|---|---|---|---|---|---|
| PriceSpe-cification-Element 33100 | | | PriceSpecifica-tionElement 33102 | | Details 33104 | | | |
| | TypeCode 33106 | E 33108 | PriceSpecifica-tionElement 33110 | Type 33112 | Code 33114 | GDT 33116 | PriceSpecification-ElementTypeCode 33118 | 1 33120 |
| | Validity-Period 33122 | E 33124 | PriceSpecifica-tionElement 33126 | Validity Period 33128 | Period 33130 | GDT 33132 | DateTimePeriod 33134 | 1 33136 |
| | Property-Definition-ClassID 33138 | E 33140 | PriceSpecifica-tionElement 33142 | Property Def-inition Class Identification 33144 | Identifier 33146 | GDT 33148 | PriceSpecification-ElementProperty-DefinitionClassID 33150 | 0..1 33152 |
| | Property-Valuation 33154 | E 33156 | PriceSpecifica-tionElement 33158 | Property-Valuation 33160 | PriceSpecifi-cationEle-mentProper-tyValuation 33162 | GDT 33164 | PriceSpecification-ElementProperty-Valuation 33166 | 1..unb ounde d 33168 |

Fig. 331b

| GDT | | Cat. | Obj. Class | Property | Rep./ Assoc. | Type | Type Name | Card. |
|---|---|---|---|---|---|---|---|---|
| | Price 33170 | E 33172 | Value 33174 | Price 33176 | Price 33178 | GDT 33180 | Price 33182 | 0..1 33184 |
| | Percent 33186 | E 33188 | Value 33190 | Percent 33192 | Percent 33194 | GDT 33196 | Percent 33198 | 0..1 33100A |
| | FixedAmount 33102A | E 33104A | Value 33106A | Fixed amount 33108A | Amount 33110A | GDT 33112A | Amount 33114A | 0..1 33116A |
| | ScaleLine 33118A | E 33120A | PriceSpeci-fication-Element 33122A | ScaleLine 33124A | PriceSpecification ElementScaleLine 33126A | GDT 33128A | PriceSpecifica-tionElement-ScaleLine 33130A | 0..unbounded 33132A |

Fig. 332

| GDT | Object Class | Property | Rep. / Assoc. | Type | Type Name | Len. | Remarks |
|---|---|---|---|---|---|---|---|
| PriceSpecificationElementPropertyDefinitionClassID 33200 | PriceSpecificationElementProperty Definition Class 33202 | Identification 33204 | Identifier 33206 | CCT 33208 | Identifier 33210 | 1..50 33212 | Restricted 33214 |

Fig. 333

| GDT | Object Class | Property | Rep. / Assoc. | Type | Type Name | Len. | Remarks |
|---|---|---|---|---|---|---|---|
| PriceSpecificationElementPropertyID 33300 | PriceSpecificationElementProperty 33302 | Identification 33304 | Identifier 33306 | CCT 33308 | Identifier 33310 | 1..30 33312 | Restricted 33314 |

Fig. 334

| GDT | | Cat. | Obj. Class | Property | Rep./ Assoc. | Type | Type Name | Card. |
|---|---|---|---|---|---|---|---|---|
| PriceSpecificationElementPropertyReference 33400 | | | PriceSpecificationElementProperty Reference 33402 | | Details 33404 | | | |
| | PriceSpecificationElementProperty ID 33406 | E 33408 | PriceSpecificationElementProperty Reference 33410 | PriceSpecification-ElementProperty-Identification 33412 | Identifier 33414 | GDT 33416 | PriceSpecificationElement-PropertyID 33418 | 1 33420 |
| | PriceSpecificationElementProperty Definition-ClassID 33422 | E 33424 | PriceSpecificationElementProperty Reference 33426 | PriceSpecification-ElementProperty-DefinitionClass-Identification 33428 | Identifier 33430 | GDT 33432 | PriceSpecificationElement-PropertyDefinitionClassID 33434 | 0..1 33436 |

Fig. 335

| GDT | | Cat. | Obj. Class | Property | Rep./ Assoc. | Type | Type Name | Card. |
|---|---|---|---|---|---|---|---|---|
| PriceSpecification-Element-Property-Valuation 33500 | | | PriceSpecificationElementProperty Valuation 33502 | | Details 33504 | | | |
| | TypeIndicator 33506 | E 33508 | PriceSpecificationElementProperty Valuation 33510 | IType 33512 | Indicator 33514 | GDT 33516 | Indicator 33518 | 0..1 33520 |
| | PriceSpecificationElementProperty Reference 33522 | E 33524 | PriceSpecificationElementProperty Valuation 33526 | PriceSpecificationElement-Property Reference 33528 | PriceSpecificationElement-PropertyReference 33530 | GDT 33532 | PriceSpecificationElement-PropertyReference 33534 | 1 33536 |
| | PriceSpecificationElementProperty Value 33538 | E 33540 | PriceSpecificationElementProperty Valuation 33542 | PriceSpecificationElement-Property Value 33544 | PriceSpecificationElement-PropertyValue 33546 | GDT 33548 | PriceSpecificationElement-PropertyValue 33550 | 1 33552 |

Fig. 336a

| GDT | | Cat. | Obj. Class | Prop. | Rep./ Ass. Qual. | Rep./ Assoc. | Type | Type Name | Len. | Card. |
|---|---|---|---|---|---|---|---|---|---|---|
| PriceSpecificationElementPropertyValue 33600 | | E 33602 | PriceSpecificationElementPropertyValue 33604 | | | Details 33606 | | | | |
| | Code 33608 | E 33610 | PriceSpecificationElementPropertyValue 33612 | Code 33614 | | Code 33616 | CCT 33618 | Code 33620 | 1..50 33622 | 0..1 33624 |
| | ID 33626 | E 33628 | PriceSpecificationElementPropertyValue 33630 | Identification 33632 | | Identifier 33634 | CCT 33636 | Identifier 33638 | 1..50 33640 | 0..1 33642 |
| | Integer Value 33644 | E 33646 | PriceSpecificationElementPropertyValue 33648 | Integer Value 33650 | Integer 33652 | Value 33654 | GDT 33656 | Integer-Value 33658 | | 0..1 33660 |
| | Date 33662 | E 33664 | PriceSpecificationElementPropertyValue 33666 | Date 33668 | | Date 33670 | GDT 33672 | Date 33674 | | 0..1 33676 |

Fig. 336b

| GDT | | Cat. | Obj. Class | Prop. | Rep./ Ass. Qual. | Rep./ Assoc. | Type | Type Name | Len. | Card. |
|---|---|---|---|---|---|---|---|---|---|---|
| | Time 33678 | E 33680 | PriceSpecification ElementProperty Value 33682 | Time 33684 | | Time 33686 | GDT 33688 | Time 33690 | | 0..1 33692 |
| | Indica-tor 33694 | E 33696 | PriceSpecification ElementProperty Value 33698 | Indicator 33600A | | Indicator 33602A | GDT 33604A | Indica-tor 33606A | | 0..1 33608A |

Fig. 337

| GDT | | Cat. | Obj. Class | Property | Rep./ Assoc. | Type | Type Name | Card. |
|---|---|---|---|---|---|---|---|---|
| PriceSpecification-ElementScaleLine 33700 | | | PriceSpecification-ElementScaleLine 33702 | | Details 33704 | | | |
| | ScaleAxis-Step 33706 | E 33708 | PriceSpecification-ElementScaleLine 33710 | ScaleAxis-Step 33712 | ScaleAxis-Step 33714 | GDT 33716 | ScaleAxis-Step 33718 | 1..2 33720 |
| | Price 33722 | E 33724 | PriceSpecification-ElementScaleLine 33726 | Price 33728 | Price 33730 | GDT 33732 | Price 33734 | 0..1 33736 |
| | Percent 33738 | E 33740 | PriceSpecification-ElementScaleLine 33742 | Percent 33744 | Percent 33746 | GDT 33748 | Percent 33750 | 0..1 33752 |
| | Fixed-Amount 33754 | E 33756 | PriceSpecification-ElementScaleLine 33758 | Fixed-Amount 33760 | Amount 33762 | GDT 33764 | Amount 33766 | 0..1 33768 |

Fig. 338

| GDT | Object Class | Property | Rep. / Assoc. | Type | Type Name | Len. | Remarks |
|---|---|---|---|---|---|---|---|
| PriceSpecification-ElementTypeCode 33800 | PriceSpecification-Element 33802 | Type 33804 | Code 33806 | CCT 33808 | Code 33810 | 4 33812 | Restricted 33814 |

Fig. 339

| GDT | Object Class | Property | Rep. / Assoc. | Type | Type Name | Len. | Remarks |
|---|---|---|---|---|---|---|---|
| ProductAttributeGroupID 33900 | Product AttributeGroup 33902 | Identification 33904 | Identifier 33906 | CCT 33908 | Identifier 33910 | 1..16 33912 | Restricted 33914 |

Fig. 340

| GDT | | Cat. | Obj. Class | Prop. Qual. | Property | Rep./ Assoc. | Type | Type Name | Len. | Card. | Remarks |
|---|---|---|---|---|---|---|---|---|---|---|---|
| Promo-tionIn-ternalID 34000 | | | Promotion 34002 | Internal 34004 | Identification 34006 | Identifier 34008 | GDT 34010 | Promo-tionID 34012 | 1..35 34014 | | restricted 34016 |
| | Scheme-AgencyID 34018 | A 34020 | Identifica-tionScheme Agency 34022 | | Identification 34024 | Identifier 34026 | XSD 34028 | Token 34030 | 1..60 34032 | 0.1 34034 | |

Fig. 341

| GDT | Obj. Class | Prop. Qual. | Property | Rep./ Assoc. | Type | Type Name | Len. | Remarks |
|---|---|---|---|---|---|---|---|---|
| PromotionPartyID 34100 | Promotion 34102 | Party 34104 | Identification 34106 | Identifier 34108 | GDT 34110 | PromotionID 34112 | 1..35 34114 | Restricted 34116 |

Fig. 342

| GDT | | Cat. | Obj. Class | Property | Rep./ Assoc. | Type | Type Name | Len. | Card. |
|---|---|---|---|---|---|---|---|---|---|
| Received-Quantity-Accumulation 34200 | | | Received Quantity Accumulation 34202 | Details 34204 | Details 34206 | | | | |
| | Reference-Period 34208 | E 34210 | Received Quantity Accumulation 34212 | Reference-Period 34214 | Details 34216 | GDT 34218 | DateTime-Period 34220 | | 0..1 34222 |
| | Quantity 34224 | E 34226 | Received Quantity Accumulation 34228 | Quantity 34230 | Quantity 34232 | GDT 34234 | Quantity 34236 | 13,6 34238 | 1 34240 |
| | Reconcilia-tionDate-Time 34242 | E 34244 | Received Quantity Accumulation 34246 | Reconciliation 34248 | DateTime 34250 | GDT 34252 | DateTime 34254 | | 0..1 34256 |
| | Reoncilia-tionQuantity 34258 | E 34260 | Received Quantity Accumulation 34262 | Reconciliation 34264 | Quantity 34266 | GDT 34268 | Quantity 34270 | | 0..1 34272 |

Fig. 343

| GDT | Property | Rep./ Assoc. | Type | Type Name |
|---|---|---|---|---|
| ReleasedIndicator 34300 | Released Indicator 34302 | Indicator 34304 | CCT 34306 | Indicator 34308 |

Fig. 344

| GDT | Property | Rep./ Assoc. | Type |
|---|---|---|---|
| RelevanceIndicator 34400 | Relevance 34402 | Indicator 34404 | CCT:Indicator 34406 |

Fig. 345

| GDT | Property | Rep./ Assoc. | Type |
|---|---|---|---|
| ReturnsIndicator 34500 | Returns 34502 | Indicator 34504 | CCT:Indicator 34506 |

Fig. 346

| GDT | Obj. Class | Property | Rep./ Assoc. | Type | Type Name | Len. |
|---|---|---|---|---|---|---|
| ReturnMaterial-AuthorisationID 34600 | Return Material Authorisation 34602 | Identification 34604 | Identifier 34606 | CCT 34608 | Identifier 34610 | 1..20 34612 |

Fig. 347

| GDT | Cat. | Property | Rep./ Assoc. | Type | Type Name |
|---|---|---|---|---|---|
| RevocationIndicator 34700 | E 34702 | Revocation 34704 | Indicator 34706 | CCT 34708 | Indicator 34710 |

Fig. 348a

| GDT | | Cat. | Obj. Class | Property | Rep./ Assoc. | Type | Type Name | Card. |
|---|---|---|---|---|---|---|---|---|
| ScaleAxisStep 34800 | | | ScaleAxisStep 34802 | | Details 34804 | | | |
| | ScaleAxis-BaseCode 34806 | E 34808 | ScaleAxisStep 34810 | ScaleAxisBase 34812 | Code 34814 | GDT 34816 | ScaleAxis-BaseCode 34818 | 1 34820 |
| | IntervalBoun-daryTypeCode 34822 | E 34824 | ScaleAxisStep 34826 | Interval Boundary Type 34828 | Code 34830 | GDT 34832 | ScaleAxis-StepInterval-Boundary-TypeCode 34834 | 1 34836 |
| | Amount 34838 | E 34840 | ScaleAxisStep 34842 | Amount 34844 | Amount 34846 | GDT 34848 | Amount 34850 | 0..1 34852 |
| | Quantity 34854 | E 34856 | ScaleAxisStep 34858 | Quantity 34860 | Quantity 34862 | GDT 34864 | Quantity 34866 | 0..1 34868 |

Fig. 348b

| GDT | | Cat. | Obj. Class | Property | Rep./ Assoc. | Type | Type Name | Card. |
|---|---|---|---|---|---|---|---|---|
| | DecimalValue 34870 | E 34872 | ScaleAxisStep 34874 | DecimalValue 34876 | Decimal-Value 34878 | GDT 34880 | Decimal-Value 34882 | 0..1 34884 |
| | IntegerValue 34886 | E 34888 | ScaleAxisStep 34890 | IntegerValue 34892 | Integer-Value 34894 | GDT 34896 | Integer-Value 34898 | 0..1 34800A |

Fig. 349

| GDT | Rep./Ass. Qualifier | Representation/ Association | Type | Type Name |
|---|---|---|---|---|
| SearchText 34900 | Search 34902 | Text 34904 | xsd 34906 | string 34908 |

Fig. 350

| GDT | Property | Rep./Assoc. | Type | Type Name | Len. | Remarks |
|---|---|---|---|---|---|---|
| SerialID 35000 | Serial Identification 35002 | Identifier 35004 | CCT 35006 | Identifier 35008 | 1..30 35010 | restricted 35012 |

Fig. 351

| GDT | | Cat. | Obj. Class | Property | Rep./ Assoc. | Type | Type Name | Len. | Card. |
|---|---|---|---|---|---|---|---|---|---|
| Shipped-Quantity-Accumulation 35100 | | | Shipped Quantity Accumulation 35102 | Details 35104 | Details 35106 | | | | |
| | Reference-Period 35108 | E 35110 | Shipped Quantity Accumulation 35112 | Reference-Period 35114 | Details 35116 | GDT 35118 | DateTime-Period 35120 | | 0..1 35122 |
| | Quantity 35124 | E 35126 | Shipped Quantity Accumulation 35128 | Quantity 35130 | Quantity 35132 | GDT 35134 | Quantity 35136 | 13,6 35138 | 1 35140 |

Fig. 352

| GDT | Obj. Class | Property | Rep./ Assoc. | Type | Type Name | Len. | Remarks |
|---|---|---|---|---|---|---|---|
| SupplyChainException StatusCode 35200 | SupplyChain-Exception 35202 | Status 35204 | Code 35206 | CCT 35208 | Code 35210 | 1..15 35212 | Restricted 35214 |

Fig. 353

| GDT | | Cat. | Obj. Class | Property | Rep./ Assoc. | Type | Type Name | Len. | Card. | Remarks |
|---|---|---|---|---|---|---|---|---|---|---|
| Supply-Chain-Exception-TypeID 35300 | | | SupplyChain-Exception 35302 | Type 35304 | Identifier 35306 | CCT 35308 | Identifier 35310 | 1..4 35312 | | restricted 35314 |
| | Scheme-Agency-ID 35316 | A 35318 | Identification-Scheme-Agency 35320 | Identification 35322 | Identifier 35324 | XSD 35326 | Token 35328 | 1..60 35330 | 0..1 35332 | |

Fig. 354

| GDT | | Cat. | Obj. Class | Property | Rep./ Assoc. | Type | Type Name | Card. |
|---|---|---|---|---|---|---|---|---|
| SystemAdmin-istrativeData 35400 | | | System Administrative Data 35402 | | Details 35404 | | | |
| | CreationDate-Time 35406 | E 35408 | System Administrative Data 35410 | Creation DateTime 35412 | DateTime 35414 | GDT 35416 | DateTime 35418 | 1..1 35420 |
| | CreationUser-AccountID 35422 | E 35424 | System Administrative Data 35426 | Creation User Account ID 35428 | Identifier 35430 | GDT 35432 | User-AccountID 35434 | 1..1 35436 |
| | LastChange-DateTime 35438 | E 35440 | System Administrative Data 35442 | Last Change DateTime 35444 | DateTime 35446 | GDT 35448 | DateTime 35450 | 0..1 35452 |
| | LastChange-UserAccountID 35454 | E 35456 | System Administrative Data 35458 | Last Change User Account ID 35460 | Identifier 35462 | GDT 35464 | User-AccountID 35466 | 0..1 35468 |

Fig. 355

| CDT | | Cat. | Obj. Class | Property | Rep./ Assoc. | Type | Type Name | Len. | Card. | Remarks |
|---|---|---|---|---|---|---|---|---|---|---|
| TaxAuthority-Party 35500 | | | Tax Authority Party 35502 | | Details 35504 | | | | | |
| | ID 35506 | E 35508 | Tax Authority Party 35510 | Identifi-cation 35512 | Identifier 35514 | CCT 35516 | Identifier 35518 | 20 35520 | 0..1 35522 | Restricted 35324 |
| | Country-Code 35526 | E 35528 | Tax Authority Party 35530 | Country 35532 | Code 35534 | GDT 35536 | Country-Code 35538 | | 1 35540 | |
| | Region-Code 35542 | E 35544 | Tax Authority Party 35546 | Region 35548 | Code 35550 | GDT 35552 | Region-Code 35554 | | 0..1 35556 | |
| | Address 35558 | E 35560 | Tax Authority Party 35562 | Address 35564 | Address 35566 | GDT 35568 | Address 35570 | | 0..1 35572 | Restricted 35574 |

Fig. 356

| GDT | Obj. Class | Property | Rep./ Assoc. | Type | Type Name | Len. |
|---|---|---|---|---|---|---|
| TaxIdentification-NumberTypeCode 35600 | Tax Identification Number 35602 | Type 35604 | Code 35606 | CCT 35608 | Code 35610 | 3..4 35612 |

Fig. 357

| GDT | Cat. | Property | Rep./ Assoc. | Type | Type Name |
|---|---|---|---|---|---|
| TestDataIndicator 35700 | E 35702 | Test Data 35704 | Indicator 35706 | CCT 35708 | Indicator 35710 |

Fig. 358

| GDT | | Cat. | Obj. Class | Property | Rep./ Assoc. | Type | Type Name | Len. | Card. |
|---|---|---|---|---|---|---|---|---|---|
| User-AccountID 35800 | | | User Account 35802 | Identifica-tion 35804 | Identifier 35806 | CCT 35808 | Identifi-er 35810 | 1..255 35812 | |
| | scheme-AgencyID 35814 | A 35816 | Identification-Scheme-Agency 35818 | Identifica-tion 35820 | Identifier 35822 | xsd 35824 | token 35826 | 1..60 35828 | 0..1 35830 |
| | schemeAgency-SchemeAgency-ID 35832 | A 35834 | Identification-Scheme-Agency 35836 | Scheme-Agency 35838 | Identifier 35840 | xsd 35842 | token 35844 | 3 35846 | 0..1 35848 |

FIG. 361A

| Package 36100 | L1 36102 | L2 36104 | L3 36106 | L4 36108 | L5 36110 | L6 36112 | L7 36114 | L8 36116 | Card. 36118 | Type 36120 | Name 36122 |
|---|---|---|---|---|---|---|---|---|---|---|---|
| Catalogue Update Message 36124 | Catalogue Update Message 36126 | | | | | | | | | GDT 36128 | Catalogue Update Message 36130 |
| Message Header 36132 | | Message Header 36140 | | | | | | | 1 36142 | GDT 36144 | Business Document Message Header 36146 |
| | | | ID 36150 | | | | | | 1 36152 | GDT 36154 | Business Document Message ID 36156 |
| | | | Creation Date Time 36158 | | | | | | 1 36160 | GDT 36162 | DateTime 36164 |

FIG. 361B

| CatalogueUpdateMessage 36124 | | | | | |
|---|---|---|---|---|---|
| Message Header 36132 | | SenderParty 36166 | 0..1 36168 | GDT 36170 | BusinessDocument MessageHeader Party 36172 |
| Transmission Information 36134 | Transmission Header 36174 | | 0..1 36176 | GDT 36178 | BusinessDocument Transmission Header 36180 |
| | | ID 36182 | 1 36184 | GDT 36186 | TransmissionID 36188 |
| | | PackageOrdinalNumber Value 36190 | 1 36192 | GDT 36194 | OrdinalNumber Value 36196 |
| | | PackageTotalNumber Value 36198 | 0..1 36100A | GDT 36102A | TotalNumberValue 36104A |
| | | MinimumRequested LogItemSeverityCode 36106A | 0..1 36108A | GDT 36110A | LogItemSeverity Code 36112A |
| Catalogue 36136 | Catalogue 36114A | | 1 36116A | GDT 36118A | Transmission Catalogue 36120A |

FIG. 361C

| CatalogueUpdateMessage 36124 | | | | |
|---|---|---|---|---|
| Catalogue 36136 | @languageCode 36122A | 0..1 36124A | GDT 36126A | LanguageCode 36128A |
| | @currencyCode 36130A | 0..1 36132A | GDT 36134A | CurrencyCode 36136A |
| | @unitCode 36138A | 0..1 36140A | GDT 36142A | MeasureUnitCode 36144A |
| | @actionCode 36146A | 0..1 36148A | GDT 36150A | ActionCode 36152A |
| | ID 36154A | 1 36156A | GDT 36158A | CatalogueID 36160A |
| | VersionID 36162A | 0..1 36164A | GDT 36166A | VersionID 36168A |
| | Name 36170A | 0..n 36172A | GDT 36174A | Name 36176A |
| | TypeCode 36178A | 1 36180A | GDT 36182A | CatalogueTypeCode 36184A |

FIG. 361D

| CatalogueUpdateMessage 36124 | | | | | | |
|---|---|---|---|---|---|---|
| Catalogue 36136 | ValidityPeriod 36186A | | | 0..1 36188A | GDT 36190A | DateTimePeriod 36192A |
| | | StartDateTime 36196A | | 0..1 36198A | GDT 36100B | DateTime 36102B |
| | | EndDateTime 36104B | | 0..1 36106B | GDT 36108B | DateTime 36110B |
| Global Information 36112B | Provider Property Valuation 36118B | | | 0..n 36120B | GDT 36122B | PropertyValuation 36124B |
| | | Property Reference 36128B | | 1 36130B | GDT 36132B | PropertyReference 36134B |
| | | | ID 36138B | 1 36140B | GDT 36142B | PropertyID 36144B |
| | | PropertyValue 36148B | | 0..n 36150B | GDT 36152B | PropertyValue 36154B |

FIG. 361E

| | | | | | |
|---|---|---|---|---|---|
| CatalogueUpdateMessage 36124 | | | | | |
| Catalogue 36136 | | | | | |
| Global Information 36112B | AmountSpecification 36158B | | 0..1 36160B | | |
| | | Amount 36162B | 0..1 36164B | GDT 36166B | Amount 36168B |
| | | LowerAmount 36170B | 0..1 36172B | GDT 36174B | Amount 36176B |
| | | UpperAmount 36178B | 0..1 36180B | GDT 36182B | Amount 36184B |
| | QualitySpecification 36186B | | 0..1 36188B | | |
| | | Quantity 36190B | 0..1 36192B | GDT 36194B | Quantity 36196B |
| | | LowerQuantity 36198B | 0..1 36100C | GDT 36102C | Quantity 36104C |
| | | UpperQuantity 36106C | 0..1 36108C | GDT 36110C | Quantity 36112C |
| | DecimalSpecification 36114C | | 0..1 36116C | | |

FIG. 361F

| | | | | |
|---|---|---|---|---|
| CatalogueUpdateMessage 36124 | | | | |
| Catalogue 36136 | | | | |
| Global Information 36112B | | | | |
| | | DecimalValue 36118C | 0..1 36119C | GDT 36120C | DecimalValue 36122C |
| | | LowerDecimalValue 36124C | 0..1 36126C | GDT 36128C | DecimalValue 36130C |
| | | UpperDecimalValue 36132C | 0..1 36134C | GDT 36136C | DecimalValue 36138C |
| | FloatSpecification 36140C | | 0..1 36142C | | |
| | | FloatValue 36144C | 0..1 36146C | GDT 36148C | FloatValue 36150C |
| | | LowerFloatValue 36152C | 0..1 36154C | GDT 36156C | FloatValue 36158C |
| | | UpperFloatValue 36160C | 0..1 36162C | GDT 36164C | FloatValue 36166C |
| | IntegerSpecification 36168C | | 0..1 36170C | | |

FIG. 361G

| | | | | | |
|---|---|---|---|---|---|
| CatalogueUpdateMessage 36124 | | | | | |
| Catalogue 36136 | | | | | |
| Global Information 36112B | | IntegerValue 36172C | 0..1 36174C | GDT 36176C | IntegerValue 36178C |
| | | LowerInteger Value 36180C | 0..1 36182C | GDT 36184C | IntegerValue 36186C |
| | | UpperInteger Value 36188C | 0..1 36190C | GDT 36192C | IntegerValue 36194C |
| | DateTime Specification 36196C | | 0..1 36198C | | |
| | | DateTime 36100D | 0..1 36102D | GDT 36104D | DateTime 36106D |
| | | StartDateTime 36108D | 0..1 36110D | GDT 36112D | DateTime 36114D |

FIG. 361H

| | | | | | | | |
|---|---|---|---|---|---|---|---|
| CatalogueUpdateMessage | 36124 | | | | | | |
| Catalogue | 36136 | | | | | | |
| Global Information 36112B | | EndDateTime 36116D | | 0..1 36118D | GDT 36120D | DateTime 36122D |
| | Name Specification 36124D | | | 0..1 36126D | | |
| | | Name 36128D | | 0..1 36130D | GDT 36132D | Name 36134D |
| | | | @Language Code 36133D | 0..1 36135D | | |
| | Indicator Specification 36136D | | | 0..1 36138D | | |
| | | Indicator 36140D | | 0..1 36142D | GDT 36144D | Indicator 36146D |

FIG. 361I

CatalogueUpdateMessage 36124

Catalogue 36136

| | | | | | |
|---|---|---|---|---|---|
| Model 36114B | Model 36148D | | 0..1 36150D | GDT 36152D | CatalogueModel 36154D |
| | | PropertyDataTypeList CompleteTransmission Indicator 36156D | 0..1 36158D | GDT 36160D | CompleteTransmission Indicator 36162D |
| | | PropertyList CompleteTransmission Indicator 36164D | 0..1 36166D | GDT 36168D | CompleteTransmission Indicator 36170D |
| | | CatalogueSectionType ListComplete TransmissionIndicator 36172D | 0..1 36174D | GDT 36176D | CompleteTransmission Indicator 36178D |
| | | CatalogueSchemaList CompleteTransmission Indicator 36180D | 0..1 36182D | GDT 36184D | CompleteTransmission Indicator 36186D |

FIG. 361J

| | | | | | | | | |
|---|---|---|---|---|---|---|---|---|
| CatalogueUpdateMessage 36124 | | | | | | | | |
| Catalogue 36136 | | | | | | | | |
| Model 36114B | | | | | | | | |
| Property DataType 36188D | PropertyDate Type 36195D | | | 0..n 36196D | GDT 36197D | PropertyDataType 36198D |
| | | @action Code 36100E | | 0..1 36101E | GDT 36102E | ActionCode 36104E |
| | | ID 36106E | | 0..1 36108E | GDT 36110E | PropertyDataTypeID 36112E |
| | | Preferred Name 36114E | | 1.n 36116E | GDT 36118E | Name 36120E |
| | | | @language Code 36122E | 0..1 36124E | | |
| | | Format Code 36126E | | 1 36128E | GDT 36130E | PropertyDataType FormalCode 36132E |

FIG. 361K

| | | | | | | |
|---|---|---|---|---|---|---|
| CatalogueUpdateMessage 36124 | | | | | | |
| Catalogue 36136 | | | | | | |
| Model 36114B | | | | | | |
| Property DataType 36188D | MaximumTotal DigitNumberValue 36134E | | | 0..1 36136E | GDT 36138E | DigitNumber Value 36140E |
| | FractionalDigit NumberValue 36142E | | | 0..1 36144E | GDT 36146E | DigitNumber Value 36148E |
| | Component Property 36150E | | | 0..n 36152E | | |
| | | Reference 36154E | | 1 36156E | GDT 36158E | Property Reference 36160E |
| | | | ID 36162E | 1 36164E | GDT 36166E | PropertyID 36168E |
| | | Ordinal NumberValue 36170E | | 0..1 36172E | GDT 36174E | OrdinalNumber Value 36176E |
| | AllowedProperty ValueElement 36178E | | | 0..n 36180E | | |

FIG. 361L

| | | | | | | | |
|---|---|---|---|---|---|---|---|
| CatalogueUpdateMessage 36124 | | | | | | | |
| Catalogue 36136 | | | | | | | |
| Model 36114B | | | | | | | |
| Property DataType 36188D | | | Property Value 36182E | 1 36184E | GDT 36186E | PropertyValue 36188E |
| Property 36190D | Property 36192E | | | 0..n 36194E | GDT 36196E | Property 36198E |
| | | @actionCode 36102F | | 0..1 36104F | GDT 36106F | ActionCode 36108F |
| | | ID 36110F | | 1 36112F | GDT 36114F | PropertyID 36116F |
| | | PreferredName 36118F | | 1..n 36120F | GDT 36122F | Name 36124F |
| | | PropertyDate TypeReference 36126F | | 1 36128F | GDT 36130F | PropertyDataType Reference 36132F |
| | | | ID 36136F | 1 36138F | GDT 36140F | PropertyDataType Reference 36142F |

FIG. 361M

| | | | | |
|---|---|---|---|---|
| CatalogueUpdateMessage 36124 | | | | |
| Catalogue 36136 | | | | |
| Model 36114B | | | | |
| Property 36190D | AspectID 36146F | 0..n 36148F | GDT 36150F | AspectID 36152F |
| | Target InterfaceElementID 36154F | 0..n 36156F | GDT 36158F | InterfaceElementID 36160F |
| | MultipleValueIndicator 36162F | 0..1 36164F | GDT 36166F | PropertyMultipleValue Indicator 36168F |
| | TextSearchableIndicator 36170F | 0..1 36172F | GDT 36174F | TextSearchableIndicator 36176F |
| | ParametricSearchable Indicator 36178F | 0..1 36180F | GDT 36182F | PropertyParametric SearchableIndicator 36184F |
| | ValuationRequiredIndicator 36188F | 0..1 36190F | GDT 36192F | PropertyValuation RequiredIndicator 36194F |

FIG. 361N

| | | | | |
|---|---|---|---|---|
| CatalogueUpdateMessage 36124 | | | | |
| Catalogue 36136 | | | | |
| Model 36114B | | | | |
| Catalogue Section Type 36192D | Catalogue SectionType 36194F | 0..n 36196F | GDT 36198F | CatalogueSection Type 36100G |
| @actionCode 36102G | | 0..1 36104G | GDT 36106G | ActionCode 36108G |
| ID 36110G | | 1 36112G | GDT 36114G | CatalogueSection TypeID 36116G |
| Name 36118G | | 0..n 36120G | GDT 36122G | Name 36124G |
| SectionProperty 36126G | | 0..n 36128G | GDT 36130G | CatalogueSection TypeSectionProperty 36132G |

FIG. 361O

| | | | | | | | | |
|---|---|---|---|---|---|---|---|---|
| CatalogueUpdateMessage 36124 | | | | | | | | |
| Catalogue 36136 | | | | | | | | |
| Model 36114B | | | | | | | | |
| Catalogue Section Type 36192D | | | Property Reference 36134G | | 1 36136G | GDT 36138G | Property Reference 36140G |
| | | | | ID 36144G | 1 36146G | GDT 36148G | PropertyID 36150G |
| | | | Ordinal NumberValue 36152G | | 1 36154G | GDT 36156G | OrdinalNumber Value 36158G |
| Catalogue Schema 36194D | Catalogue Scheme 36160G | | | | 0..n 36162G | GDT 36164G | Catalogue Schema 36166G |
| | | @action Code 36168G | | | 0..1 36170G | GDT 36172G | ActionCode 36174G |
| | | ID 36176G | | | 1 36178G | GDT 36180G | Catalogue SchemaID 36182G |

FIG. 361P

| | | | | | |
|---|---|---|---|---|---|
| CatalogueUpdateMessage 36124 | | | | | |
| Catalogue 36136 | | | | | |
| Model 36114B | | | | | |
| Catalogue Schema 36194D | TypeCode 36184G | 0..1 36186G | GDT 36188G | CatalogueSchema TypeCode 36190G |
| | Name 36192G | 0..n 36194G | GDT 36196G | Name 36198G |
| | CatalogueSectionList CompleteTransmission Indicator 36100H | 0..1 36102H | GDT 36104H | CompleteTransmission Indicator 36106H |
| | CatalogueSectionRelationship ListCompleteTransmission Indicator 36108H | 0..1 36110H | GDT 36112H | CompleteTransmission Indicator 36114H |
| | CatalogueItemProperty 36116H | 0..n 36118H | GDT 36120H | CatalogueSchema CatalogueItemProperty 36122H |

FIG. 361Q

CatalogueUpdateMessage 36124

Catalogue 36136

Model 36114B

| | | | | | | |
|---|---|---|---|---|---|---|
| Catalogue Schema 36194D | | Property Reference 36124H | | 1 36126H | GDT 36128H | PropertyReference 36130H |
| | | | ID 36134H | 1 36136H | GDT 36138H | PropertyID 36140H |
| | | Ordinal NumberValue 36142H | | 1 36144H | GDT 36146H | OrdinalNumberValue 36148H |
| | Catalogue Section 36150H | | | 0..n 36152H | GDT 36154H | CatalogueSection 36156H |
| | | @actionCode 36158H | | 0..1 36160H | GDT 36162H | ActionCode 36164H |
| | | ID 36166H | | 1 36168H | GDT 36170H | CatalogueSectionID 36172H |

FIG. 361R

| | | | | | | |
|---|---|---|---|---|---|---|
| CatalogueUpdateMessage 36124 | | | | | | |
| Catalogue 36136 | | | | | | |
| Model 36114B | | | | | | |
| Catalogue Schema 36194D | TypeID 36174H | | | 0..1 36176H | GDT 36178H | CatalogueSectionTypeID 36180H |
| | Name 36182H | | | 0..n 36184H | GDT 36186H | Name 36188H |
| | Property Valuation 36190H | | | 0..n 36192H | GDT 36194H | PropertyValuation 36196H |
| | Catalogue ItemProperty 36100I | | | 0..n 36102I | GDT 36104I | CatalogueSectionCatalogueItemProperty 36106I |
| | | Property Reference 36108I | | 1 36110I | GDT 36112I | PropertyReference 36114I |
| | | | ID 36118I | 1 36120I | GDT 36122I | PropertyID 36123I |
| | | Ordinal NumberValue 36124I | | 1 36126I | GDT 36128I | OrdinalNumberValue 36129I |

FIG. 361S

| | | | | | | | |
|---|---|---|---|---|---|---|---|
| CatalogueUpdateMessage 36124 | | | | | | | |
| Catalogue 36136 | | | | | | | |
| Model 36114B | | | | | | | |
| Catalogue Schema 36194D | | | Catalogue Section Relationship 36130I | | 0..n 36132I | GDT 36134I | Catalogue Section Relationship 36135I |
| | | | | @actionCode 36136I | 0..1 36138I | GDT 36140I | ActionCode 36142I |
| | | | | SourceCatalogue SectionID 36144I | 1 36146I | GDT 36148I | Catalogue SectionID 36150I |
| | | | | TargetCatalogue SectionID 36152I | 1 36154I | GDT 36156I | Catalogue SectionID 36158I |
| Content 36116B | | Content 36160I | | | 0..1 36162I | GDT 36164I | Catalogue SectionID 36166I |

FIG. 361T

| | | | | | |
|---|---|---|---|---|---|
| CatalogueUpdateMessage 36124 | | | | | |
| Catalogue 36136 | | | | | |
| Content 36116B | CatalogueItemList CompleteTransmission Indicator 36168I | | 0..1 36170I | GDT 36172I | CompleteTransmissionIndicator 36174I |
| | CatalogueItem RelationshipList CompleteTransmission Indicator 36176I | | 0..1 36178I | GDT 36180I | CompleteTransmissionIndicator 36182I |
| | CatalogueViewList Complete TransmissionIndicator 36184I | | 0..1 36186I | GDT 36188I | CompleteTrans-missionIndicator 36190I |
| | CatalogueSchemaID 36192I | | 0..1 36194I | GDT 36196I | Catalogue SchemaID 36198I |
| Catalogue Item 36100J | CatalogueItem 36102J | | 0..n 36104J | GDT 36106J | CatalogueItem 36108J |
| | | @actionCode 36110J | 0..1 36112J | GDT 36114J | ActionCode 36116J |

FIG. 361U

| | | | |
|---|---|---|---|
| CatalogueUpdateMessage 36124 | | | |
| Catalogue 36136 | | | |
| Content 36116B | | | |

| Node | Element | Sub-element | Cardinality | Type | Data Type |
|---|---|---|---|---|---|
| Catalogue Item 36100J | ID 36118J | | 1 36120J | GDT 36122J | CatalogueItemID 36124J |
| | Description 36126J | | 0..n 36128J | GDT 36130J | Description 36132J |
| | Classification 36134J | | 0..n 36136J | GDT 36138J | CatalogueItem Classification 36140J |
| | | Catalogue SchemaID 36142J | 0..1 36144J | GDT 36146J | Catalogue SchemaID 36148J |
| | | Catalogue SectionID 36150J | 1 36152J | GDT 36154J | Catalogue SectionID 36156J |
| | Property Valuation 36158J | | 0..n 36160J | GDT 36162J | PropertyValuation 36164J |

FIG. 361V

| | | | | | |
|---|---|---|---|---|---|
| CatalogueUpdateMessage 36124 | | | | | |
| Catalogue 36136 | | | | | |
| Content 36116B | | | | | |
| Catalogue Item 36100J | CatalogueItem Relationship 36168J | | 0..n 36170J | GDT 36172J | CatalogueItem Relationship 36174J |
| | | @actionCode 36176J | 0..1 36178J | GDT 36180J | ActionCode 36182J |
| | | SourceCatalogue ItemID 36184J | 1 36186J | GDT 36188J | Catalogue ItemID 36190J |
| | | TargetCatalogue ItemID 36192J | 1 36194J | GDT 36196J | Catalogue ItemID 36198J |
| | | TypeCode 36100K | 1 36102K | GDT 36104K | ObjectStructure Relationship TypeCode 36106K |

FIG. 361W

| | | | | |
|---|---|---|---|---|
| CatalogueUpdateMessage 36124 | | | | |
| Catalogue 36136 | | | | |
| Content 36116B | | | | |
| Catalogue View 36101J | Catalogue View 36108K | | | |
| | | 0..n 36110K | GDT 36112K | CatalogueView 36114K |
| | @actionCode 36116K | 0..1 36118K | GDT 36120K | ActionCode 36122K |
| | ID 36124K | 1 36126K | GDT 36128K | CatalogueViewID 36130K |
| | Name 36132K | 0..n 36134K | GDT 36136K | Name 36138K |
| | ItemListCompleteTransmissionIndicator 36140K | 0..1 36142K | GDT 36144K | CompleteTransmissionIndicator 36146K |

FIG. 361X

| | | | | | |
|---|---|---|---|---|---|
| CatalogueUpdateMessage 36124 | | | | | |
| Catalogue 36136 | | | | | |
| Content 36116B | | | | | |
| Catalogue View 36101J | ItemRelationshipTypeList CompleteTransmissionIndicator 36148K | | 0..1 36150K | GDT 36152K | Complete TransmissionIndicator 36154K |
| | ExcludedProperty ListComplete Transmission Indicatior 36156K | | 0..1 36158K | GDT 36160K | Complete TransmissionIndicator 36162K |
| | Schema 36164K | | 0..n 36166K | GDT 36168K | CatalogueView Schema 36170K |
| | | SectionList CompleteTransmissionIndicator 36172K | 0..1 36174K | GDT 36176K | Complete TransmissionIndicator 36178K |

FIG. 361Y

| | | | | | | |
|---|---|---|---|---|---|---|
| CatalogueUpdateMessage 36124 | | | | | | |
| Catalogue 36136 | | | | | | |
| Content 36116B | | | | | | |
| Catalogue View 36101J | | Catalogue SchemaID 36180K | | 1 36182K | GDT 36184K | Catalogue SchemaID 36186K |
| | | Section 36188K | | 0..n 36190K | GDT 36192K | CatalogueView SchemaSection 36194K |
| | | | @action Code 36196K | 0..1 36198K | GDT 36100L | ActionCode 36102L |
| | | | Catalogue SectionID 36104L | 1 36106L | GDT 36108L | Catalogue SectionID 36110L |
| | Item 36112L | | | 0..n 36114L | GDT 36116L | CatalogueView Item 36118L |

FIG. 361Z

| | | | | | | |
|---|---|---|---|---|---|---|
| CatalogueUpdateMessage 36124 | | | | | | |
| Catalogue 36136 | | | | | | |
| Content 36116B | | | | | | |
| Catalogue View 36101J | | @action Code 36120L | 0..1 36122L | GDT 36124L | ActionCode 36126L |
| | | Catalogue ItemID 36128L | 1 36130L | GDT 36132L | CatalogueItemID 36134L |
| | ItemRelation-shipType 36136L | | 0..n 36138L | GDT 36140L | CatalogueView ItemRelationship Type 36142L |
| | | @action Code 36144L | 0..1 36146L | GDT 36148L | ActionCode 36150L |

FIG. 361AA

| | | | | | |
|---|---|---|---|---|---|
| CatalogueUpdateMessage 36124 | | | | | |
| Catalogue 36136 | | | | | |
| Content 36116B | | | | | |
| Catalogue View 36101J | CatalogueItem Relationship TypeCode 36152L | | 1 36154L | GDT 36156L | ObjectStructure RelationshipType Code 36158L |
| Excluded Property 36160L | | | 0..n 36162L | GDT 36164L | Catalogue View Excluded Property 36166L |
| | @actionCode 36168L | | 0..1 36170L | GDT 36172L | ActionCode 36174L |
| | Property Reference 36176L | | 1 36178L | GDT 36180L | PropertyReference 36182L |
| | | ID 36186L | 1 36188L | GDT 36190L | PropertyID 36192L |

FIG. 363A

| Package 36300 | L1 36302 | L2 36304 | L3 36306 | L4 36308 | L5 36310 | L6 36312 | L7 36314 | L8 36316 | Card. 36318 | Type 36320 | Name 36322 |
|---|---|---|---|---|---|---|---|---|---|---|---|
| Catalogue Publication Message 36324 | CataloguePublicationMessage 36326 | | | | | | | | | GDT 36328 | Catalogue Publication Message 36330 |
| Message Header 36332 | | Message Header 36340 | | | | | | | 1 36342 | GDT 36344 | Business Document Message Header 36346 |
| | | | ID 36350 | | | | | | 1 36352 | GDT 36354 | Business Document MessageID 36356 |
| | | | Creation DateTime 36358 | | | | | | 1 36360 | GDT 36362 | DateTime 36364 |

FIG. 363B

| CataloguePublicationMessage 36324 | | | | | |
|---|---|---|---|---|---|
| Message Header 36332 | | SenderParty 36366 | 0..1 36368 | GDT 36370 | BusinessDocument MessageHeader Party 36372 |
| Transmission Information 36334 | Transmission Header 36374 | | 0..1 36376 | GDT 36378 | BusinessDocument TransmissionHeader 36380 |
| | | ID 36382 | 1 36384 | GDT 36386 | TransmissionID 36388 |
| | | PackageOrdinalNumber Value 36390 | 1 36392 | GDT 36394 | OrdinalNumberValue 36396 |
| | | PackageTotalNumber Value 36398 | 0..1 36300A | GDT 36302A | TotalNumberValue 36304A |
| | | Minimum Requested LogItemSeverityCode 36306A | 0..1 36308A | GDT 36310A | LogItemSeverity Code 36312A |
| Catalogue 36336 | Catalogue 36314A | | 1 36316A | GDT 36318A | Transmission Catalogue 36320A |

FIG. 363C

| | | | | |
|---|---|---|---|---|
| CataloguePublicationMessage 36324 | | | | |
| Catalogue 36336 | @language Code 36322A | 0..1 36324A | GDT 36326A | LanguageCode 36328A |
| | @currency Code 36330A | 0..1 36332A | GDT 36334A | CurrencyCode 36336A |
| | @unitCode 36338A | 0..1 36340A | GDT 36342A | MeasureUnitCode 36344A |
| | @actionCode 36346A | 0..1 36348A | GDT 36350A | ActionCode 36352A |
| | ID 36354A | 1 36356A | GDT 36358A | CatalogueID 36360A |
| | VersionID 36362A | 0..1 36364A | GDT 36366A | VersionID 36368A |
| | Name 36370A | 0..n 36372A | GDT 36374A | Name 36376A |
| | TypeCode 36378A | 1 36380A | GDT 36382A | CatalogueTypeCode 36384A |
| | ValidityPeriod 36386A | 0..1 36388A | GDT 36390A | DateTimePeriod 36392A |

FIG. 363D

| CataloguePublicationMessage 36324 | | | | | | |
|---|---|---|---|---|---|---|
| Catalogue 36336 | | StartDateTime 36396A | | 0..1 36398A | GDT 36300B | DateTime 36302B |
| | | EndDateTime 36304B | | 0..1 36306B | GDT 36308B | DateTime 36310B |
| Global Information 36312B | Provider Property Valuation 36318B | | | 0..n 36320B | GDT 36322B | PropertyValuation 36324B |
| | | Property Reference 36328B | | 1 36330B | GDT 36332B | PropertyReference 36334B |
| | | | ID 36338B | 1 36340B | GDT 36342B | PropertyID 36344B |
| | | PropertyValue 36348B | | 0..n 36350B | GDT 36352B | PropertyValue 36354B |
| | | | Amount Specification 36358B | 0..1 36360B | | |

FIG. 363E

| | | | | | | |
|---|---|---|---|---|---|---|
| CataloguePublicationMessage 36324 | | | | | | |
| Catalogue 36338 | | | | | | |
| GlobalInformation 36312B | | Amount 36362B | 0..1 36364B | GDT 36366B | Amount 36368B |
| | | LowerAmount 36370B | 0..1 36372B | GDT 36374B | Amount 36376B |
| | | UpperAmount 36378B | 0..1 36380B | GDT 36382B | Amount 36384B |
| | QuantitySpecification 36386B | | 0..1 36388B | | |
| | | Quantity 36390B | 0..1 36392B | GDT 36394B | Quantity 36396B |
| | | LowerQuantity 36398B | 0..1 36300C | GDT 36302C | Quantity 36304C |
| | | UpperQuantity 36306C | 0..1 36308C | GDT 36310C | Quantity 36312C |
| | DecimalSpecification 36314C | | 0..1 36316C | | |

FIG. 363F

CataloguePublicationMessage 36324

Catalogue 36338

| | | | | | |
|---|---|---|---|---|---|
| Global Information 36312B | | DecimalValue 36318C | 0..1 36319C | GDT 36320C | DecimalValue 36322C |
| | | LowerDecimalValue 36324C | 0..1 36326C | GDT 36328C | DecimalValue 36330C |
| | | UpperDecimalValue 36332C | 0..1 36334C | GDT 36336C | DecimalValue 36338C |
| | FloatSpecification 36340C | | 0..1 36342C | | |
| | | FloatValue 36344C | 0..1 36346C | GDT 36348C | FloatValue 36350C |
| | | LowerFloatValue 36352C | 0..1 36354C | GDT 36356C | FloatValue 36358C |
| | | UpperFloatValue 36360C | 0..1 36362C | GDT 36364C | FloatValue 36366C |
| | IntegerSpecification 36368C | | 0..1 36370C | | |
| | | IntegerValue 36372C | 0..1 36374C | GDT 36376C | IntegerValue 36378C |

FIG. 363G

| | | | | | |
|---|---|---|---|---|---|
| CataloguePublicationMessage 36324 | | | | | |
| Catalogue 36338 | | | | | |
| Global Information 36312B | | LowerIntegerValue 36380C | 0..1 36382C | GDT 36384C | IntegerValue 36386C |
| | | UpperIntegerValue 36388C | 0..1 36390C | GDT 36392C | IntegerValue 36394C |
| | DateTimeSpecification 36396C | | 0..1 36398C | | |
| | | DateTime 36300D | 0..1 36302D | GDT 36304D | DateTime 36306D |
| | | StartDateTime 36308D | 0..1 36310D | GDT 36312D | DateTime 36314D |
| | | EndDateTime 36316D | 0..1 36318D | GDT 36320D | DateTime 36322D |
| | NameSpecification 36324D | | 0..1 36326D | | |
| | | Name 36328D | 0..1 36330D | GDT 36332D | Name 36334D |

FIG. 363H

| | | | | | | | | | | | |
|---|---|---|---|---|---|---|---|---|---|---|---|
| CataloguePublicationMessage 36324 | | | | | | | | | | | |
| Catalogue 36338 | | | | | | | | | | | |
| Global Information 36312B | | | | | | | @lan-guage Code 36333D | | 0..1 36335D | | |
| | | | | | Indicator Specifica-tion 36336D | | | | 0..1 36338D | | |
| | | | | | | Indicator 36340D | | | 0..1 36342D | GDT 36344D | Indicator 36346D |
| Model 36314B | | | Model 36348D | | | | | | 0..1 36350D | GDT 36352D | Catalogue Model 36354D |
| | | | | PropertyData TypeList Complete Transmission Indicator 36356D | | | | | 0..1 36358D | GDT 36360D | Complete Trans-mission Indicator 36362D |

FIG. 363I

| | | | | | | |
|---|---|---|---|---|---|---|
| CataloguePublicationMessage 36324 | | | | | | |
| Catalogue 36338 | | | | | | |
| Model 36314B | PropertyListComplete TransmissionIndicator 36364D | | 0..1 36366D | GDT 36368D | CompleteTrans-missionIndicator 36370D |
| | CatalogueSectionType ListCompleteTransmission Indicator 36372D | | 0..1 36374D | GDT 36376D | CompleteTransmis-sionIndicator 36378D |
| | CatalogueSchemaList CompleteTransmission Indicator 36380D | | 0..1 36382D | GDT 36384D | CompleteTrans-missionIndicator 36386D |
| Property DataType 36388D | PropertyDataType 36395D | | 0..n 36396D | GDT 36397D | PropertyData Type 36398D |
| | | @action Code 36300E | 0..n 36301E | GDT 36302E | ActionCode 36304E |

FIG. 363J

| | | | | | |
|---|---|---|---|---|---|
| CataloguePublicationMessage 36324 | | | | | |
| Catalogue 36338 | | | | | |
| Model 36398A | | | | | |
| Property DataType 36388D | ID 36306E | | 0..1 36308E | GDT 36310E | PropertyDataTypeID 36312E |
| | PreferredName 36314E | | 1..n 36316E | GDT 36318E | Name 36320E |
| | | @languageCode 36322E | 0..1 36324E | | |
| | FormatCode 36326E | | 1 36328E | GDT 36330E | PropertyDataType FormatCode 36332E |
| | MaximumTotal DigitValueNumber 36334E | | 0..1 36336E | GDT 36338E | DigitNumberValue 36340E |
| | FractionalDigit NumberValue 36342E | | 0..1 36344E | GDT 36346E | DigitNumberValue 36348E |
| | Component Property 36350E | | 0..n 36352E | | |

FIG. 363K

| | | | | | | |
|---|---|---|---|---|---|---|
| CataloguePublicationMessage 36324 | | | | | | |
| Catalogue 36338 | | | | | | |
| Model 36314B | | | | | | |
| Property DataType 36388D | | Reference 36354E | | 1 36356E | GDT 36358E | Property Reference 36360E |
| | | | ID 36362E | 1 36364E | GDT 36366E | PropertyID 36368E |
| | | OrdinalNumber Value 36370E | | 0..1 36372E | GDT 36374E | OrdinalNumber Value 36376E |
| | AllowedProperty ValueElement 36378E | | | 0..n 36380E | | |
| | | PropertyValue 36382E | | 1 36384E | GDT 36386E | PropertyValue 36388E |

FIG. 363L

| | | | | | | |
|---|---|---|---|---|---|---|
| CataloguePublicationMessage 36324 | | | | | | |
| Catalogue 36338 | | | | | | |
| Model 36314B | | | | | | |
| Property 36390D | Property 36392E | | | 0..n 36394E | GDT 36396E | Property 36398E |
| | | @actionCode 36302F | | 0..1 36304F | GDT 36306F | ActionCode 36308F |
| | | ID 36310F | | 1 36312F | GDT 36314F | PropertyID 36316F |
| | | PreferredName 36318F | | 1..n 36320F | GDT 36322F | Name 36324F |
| | | PropertyDataType Reference 36326F | | 1 36328F | GDT 36330F | PropertyDataType Reference 36332F |
| | | | ID 36336F | 1 36338F | GDT 36340F | PropertyDataType ID 36342F |
| | | AspectID 36346F | | 0..n 36348F | GDT 36350F | AspectID 36352F |

FIG. 363M

| | | | | | |
|---|---|---|---|---|---|
| CataloguePublicationMessage 36324 | | | | | |
| Catalogue 36338 | | | | | |
| Model 36314B | | | | | |
| Property 36390D | | TargetInterface ElementID 36354F | 0..n 36356F | GDT 36358F | InterfaceElementID 36360F |
| | | MultipleValueIndicator 36362F | 0..1 36364F | GDT 36366F | PropertyMultiple ValueIndicator 36368F |
| | | TextSearchable Indicator 36370F | 0..1 36372F | GDT 36374F | TextSearchable Indicator 36376F |
| | | Parametric Search-ableIndicator 36378F | 0..1 36380F | GDT 36382F | PropertyParametric SearchableIndicator 36384F |
| | | ValuationRequired Indicator 36388F | 0..1 36390F | GDT 36392F | PropertyValuation RequiredIndicator 36394F |
| Catalogue Section Type 36392D | Catalogue SectionType 36394F | | 0..n 36396F | GDT 36398F | Catalogue SectionType 36300G |

FIG. 363N

| | | | | | | |
|---|---|---|---|---|---|---|
| CataloguePublicationMessage 36324 | | | | | | |
| Catalogue 36338 | | | | | | |
| Model 36314B | | | | | | |
| Catalogue Section Type 36392D | @action Code 36302G | | | 0..1 36304G | GDT 36306G | ActionCode 36308G |
| | ID 36310G | | | 1 36312G | GDT 36314G | CatalogueSection TypeID 36316G |
| | Name 36318G | | | 0..n 36320G | GDT 36322G | Name 36324G |
| | Section Property 36326G | | | 0..n 36328G | GDT 36330G | CatalogueSection TypeSection Property 36332G |
| | | PropertyReference 36334G | | 1 36336G | GDT 36338G | PropertyReference 36340G |
| | | | ID 36344G | 1 36346G | GDT 36348G | PropertyID 36350G |

FIG. 363O

| | | | | | | |
|---|---|---|---|---|---|---|
| CataloguePublicationMessage 36324 | | | | | | |
| Catalogue 36338 | | | | | | |
| Model 36312B | | | | | | |
| Catalogue Section Type 36392D | | | Ordinal Number Value 36352G | 1 36354G | GDT 36356G | Ordinal NumberValue 36358G |
| Catalogue Schema 36394D | Catalogue Schema 36360G | | | 0..n 36362G | GDT 36364G | Catalogue Schema 36366G |
| | | @actionCode 36368G | | 0..n 36370G | GDT 36372G | ActionCode 36374G |
| | | ID 36376G | | 1 36378G | GDT 36380G | Catalogue SchemaID 36382G |
| | | TypeCode 36384G | | 0..1 36386G | GDT 36388G | Catalogue SchemaType Code 36390G |
| | | Name 36392G | | 0..n 36394G | GDT 36396G | Name 36398G |

FIG. 363P

CataloguePublicationMessage 36324

Catalogue 36338

Model 36312B

| | | | | | |
|---|---|---|---|---|---|
| Catalogue Schema 36394D | CatalogueSectionList CompleteTransmission Indicator 36300H | | 0..1 36302H | GDT 36304H | Complete Transmission Indicator 36306H |
| | CatalogueSection RelationshipListComplete TransmissionIndicator 36308H | | 0..1 36310H | GDT 36312H | Complete Transmission Indicator 36314H |
| | CatalogueItemProperty 36316H | | 0..n 36318H | GDT 36320H | Catalogue Schema CatalogueItem Property 36322H |
| | | Property Reference 36324H | 1 36326H | GDT 36328H | Property Reference 36330H |

FIG. 363Q

CataloguePublicationMessage 36324

Catalogue 36338

Model 36314B

| | | | | | | |
|---|---|---|---|---|---|---|
| Catalogue Schema 36394D | | | ID 36334H | 1 36336H | GDT 36338H | PropertyID 36340H |
| | | OrdinalNumber Value 36342H | | 1 36344H | GDT 36346H | OrdinalNumber Value 36348H |
| | Catalogue Section 36350H | | | 0..n 36352H | GDT 36354H | Catalogue Section 36356H |
| | | @actionCode 36358H | | 0..1 36360H | GDT 36362H | ActionCode 36364H |
| | | ID 36366H | | 1 36368H | GDT 36370H | Catalogue SectionID 36372H |
| | | TypeID 36374H | | 0..1 36376H | GDT 36378H | Catalogue SectionTypeID 36380H |
| | | Name 36382H | | 0..n 36384H | GDT 36386H | Name 36388H |

FIG. 363R

| | | | | | | |
|---|---|---|---|---|---|---|
| CataloguePublicationMessage 36324 | | | | | | |
| Catalogue 36338 | | | | | | |
| Model 36312B | | | | | | |
| Catalogue Schema 36394D | Property Valuation 36390H | | | 0..n 36392H | GDT 36394H | Property Valuation 36396H |
| | Catalogue Item Property 36300H | | | 0..n 36302H | GDT 36304I | CatalogueSection CatalogueItem Property 36306I |
| | | Property Reference 36308I | | 1 36310I | GDT 36312I | PropertyReference 36314I |
| | | | ID 36318I | 1 36320I | GDT 36322I | PropertyID 36323I |
| | | Ordinal Number Value 36324I | | 1 36326I | GDT 36328I | OrdinalNumberValue 36329I |

FIG. 363S

| | | | | | | |
|---|---|---|---|---|---|---|
| CataloguePublicationMessage 36324 | | | | | | |
| Catalogue 36338 | | | | | | |
| Model 36314B | | | | | | |
| Catalogue Schema 36394D | | Catalogue Section Relationship 36330I | | 0..n 36332I | GDT 36334I | Catalogue Section Relationship 36335I |
| | | | @action Code 36336I | 0..1 36338I | GDT 36340I | ActionCode 36342I |
| | | | Source Catalogue SectionID 36344I | 1 36346I | GDT 36348I | Catalogue SectionID 36350I |
| | | | Target Catalogue SectionID 36352I | 1 36354I | GDT 36356I | Catalogue SectionID 36358I |
| Content 36316BI | Content 36360I | | | 0..1 36362I | GDT 36364I | Catalogue Content 36366I |

FIG. 363T

| | | | | | |
|---|---|---|---|---|---|
| CataloguePublicationMessage 36324 | | | | | |
| Catalogue 36338 | | | | | |
| Content 36316B | CatalogueItemList CompleteTrans-missionIndicator 36368I | | 0..1 36370I | GDT 36372I | CompleteTransmission Indicator 36374I |
| | CatalogueItem RelationshipList CompleteTrans-missionIndicator 36376I | | 0..1 36378I | GDT 36380I | CompleteTransmission Indicator 36382I |
| | CatalogueViewList CompleteTrans-missionIndicator 36384I | | 0..1 36386I | GDT 36388I | CompleteTransmission Indicator 36390I |
| | CatalogueSchema ID 36392I | | 0..1 36394I | GDT 36396I | CatalogSchemaID 36398I |
| Catalogue Item 36300J | CatalogueItem 36302J | | 0..n 36304J | GDT 36306J | CatalogueItem 36308J |
| | @actionCode 36310J | | 0..1 36312J | GDT 36314J | ActionCode 36316J |

FIG. 363U

| | | | | | | |
|---|---|---|---|---|---|---|
| CataloguePublicationMessage 36324 | | | | | | |
| Catalogue 36338 | | | | | | |
| Content 36316B | | | | | | |
| Catalogue Item 36300J | ID 36318J | | 1 36320J | GDT 36322J | CatalogueItemID 36324J |
| | Description 36326J | | 0..n 36328J | GDT 36330J | Description 36332J |
| | Classification 36334J | | 0..n 36336J | GDT 36338J | CatalogueItem Classification 36340J |
| | | Catalogue SchemaID 36342J | 0..1 36344J | GDT 36346J | Catalogue SchemaID 36348J |
| | | Catalogue SectionID 36350J | 1 36352J | GDT 36354J | Catalogue SectionID 36356J |
| | PropertyValuation 36358J | | 0..n 36360J | GDT 36362J | Property Valuation 36364J |

FIG. 363V

CataloguePublicationMessage 36324

Catalogue 36338

Content 36316B

| | | | | | |
|---|---|---|---|---|---|
| Catalogue Item 36300J | CatalogueItem Relationship 36368J | | 0..n 36370J | GDT 36372J | CatalogueItem Relationship 36374J |
| | | @actionCode 36376J | 0..1 36378J | GDT 36380J | ActionCode 36382J |
| | | SourceCatalogue ItemID 36384J | 1 36386J | GDT 36388J | CatalogueItemID 36390J |
| | | TargetCatalogue ItemID 36392J | 1 36394J | GDT 36396J | CatalogueItemID 36398J |
| | | TypeCode 36300K | 1 36302K | GDT 36304K | ObjectStructure RelationshipType Code 36306K |
| Catalogue View 36301J | CatalogueView 36308K | | 0..n 36310K | GDT 36312K | CatalogueView 36314K |
| | | @actionCode 36316K | 0..1 36318K | GDT 36320K | ActionCode 36322K |

FIG. 363W

| | | | | | |
|---|---|---|---|---|---|
| CataloguePublicationMessage 36324 | | | | | |
| Catalogue 36338 | | | | | |
| Content 36316B | | | | | |
| Catalogue View 36301J | ID 36324K | 1 36326K | GDT 36328K | CatalogueViewID 36330K |
| | Name 36332K | 0..n 36334K | GDT 36336K | Name 36338K |
| | ItemListCompleteTransmission Indicator 36340K | 0..1 36342K | GDT 36344K | CompleteTransmission Indicator 36346K |
| | ItemRelationshipTypeList CompleteTransmissionIndicator 36348K | 0..1 36350K | GDT 36352K | CompleteTransmission Indicator 36354K |
| | ExcludedPropertyListComplete TransmissionIndicator 36356K | 0..1 36358K | GDT 36360K | CompleteTransmission Indicator 36362K |
| | Schema 36364K | 0..n 36366K | GDT 36368K | CatalogueViewSchema 36370K |

FIG. 363X

| | | | | | | |
|---|---|---|---|---|---|---|
| CataloguePublicationMessage 36324 | | | | | | |
| Catalogue 36338 | | | | | | |
| Content 36316B | | | | | | |
| Catalogue View 36301J | | SectionList Complete Transmission Indicator 36372K | | 0..1 36374K | GDT 36376K | CompleteTransmission Indicator 36378K |
| | | Catalogue SchemaID 36380K | | 1 36382K | GDT 36384K | CatalogueSchemaID 36386K |
| | | Section 36388K | | 0..n 36390K | GDT 36392K | CatalogueView SchemaSection 36394K |
| | | | @action Code 36396K | 0..1 36398K | GDT 36300L | ActionCode 36302L |
| | | | Catalogue SectionID 36304L | 1 36306L | GDT 36308L | CatalogueSectionID 36310L |
| | Item 36312L | | | 0..n 36314L | GDT 36316L | CatalogueViewItem 36318L |
| | | @actionCode 36320L | | 0..1 36322L | GDT 36324L | ActionCode 36326L |

FIG. 363Y

| | | | | | | |
|---|---|---|---|---|---|---|
| CataloguePublicationMessage 36324 | | | | | | |
| Catalogue 36338 | | | | | | |
| Content 36316B | | | | | | |
| CatalogueView 36301J | | CatalogueItemID 36328L | 1 36330L | GDT 36332L | CatalogueItemID 36334L |
| | ItemRelationshipType 36336L | | 0..n 36338L | GDT 36340L | CatalogueViewItemRelationshipType 36342L |
| | | @actionCode 36344L | 0..1 36346L | GDT 36348L | ActionCode 36350L |
| | | CatalogueItemRelationshipTypeCode 36352L | 1 36354L | GDT 36356L | ObjectsStructureRelationshipTypeCode 36358L |
| | ExcludedProperty 36360L | | 0..n 36362L | GDT 36364L | CatalogueViewExcludedProperty 36366L |
| | | @action Code 36368L | 0..1 36370L | GDT 36372L | ActionCode 36374K |

FIG. 363Z

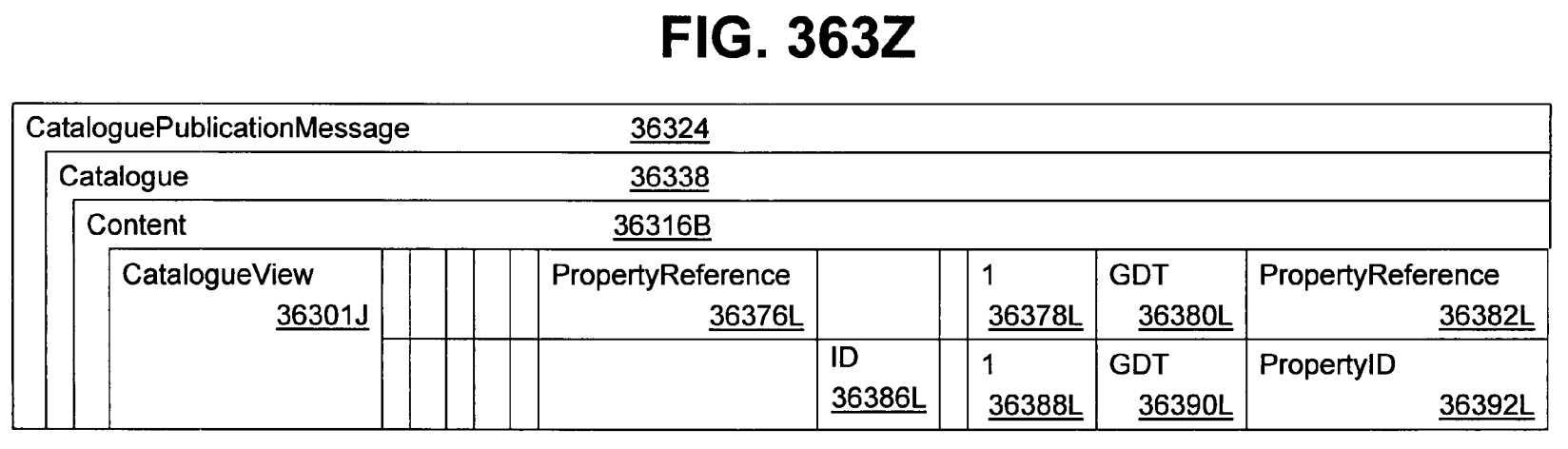

| | | | | | |
|---|---|---|---|---|---|
| CataloguePublicationMessage 36324 | | | | | |
| Catalogue 36338 | | | | | |
| Content 36316B | | | | | |
| CatalogueView 36301J | PropertyReference 36376L | | 1 36378L | GDT 36380L | PropertyReference 36382L |
| | | ID 36386L | 1 36388L | GDT 36390L | PropertyID 36392L |

FIG. 365A

| Package 36500 | L1 36502 | L2 36504 | L3 36506 | Card 36508 | Type 36510 | Name 36512 |
|---|---|---|---|---|---|---|
| CataloguePublication Transmission PackageMessage 36516 | CataloguePublication Transmission PackageMessage 36518 | | | | GDT 36520 | CataloguePublication TransmissionPackage Message 36522 |
| MessageHeader 36524 | | Message Header 36530 | | 1 36532 | GDT 36534 | Business Document Message Header 36536 |
| | | | ID 36540 | 1 36542 | GDT 36544 | Business Document MessageID 36546 |
| | | | Creation DateTime 36548 | 1 36550 | GDT 36552 | DateTime 36554 |
| | | | Sender Party 36556 | 0..1 36558 | GDT 36560 | BusinessDocument MessageHeaderParty 36562 |

FIG. 365B

| Catalogue Publication Transmission Package Message 36516 | | | | | | |
|---|---|---|---|---|---|---|
| Transmission Information 36526 | | TransmissionLog 36564 | | 0..1 36566 | | |
| | | | Item 36568 | 1..n 36570 | GDT 36572 | LogItem 36574 |
| Catalogue Publication Transmission 36528 | | CataloguePublication Transmission 36576 | | 1 36578 | GDT 36580 | CataloguePublication TransmissionPackage 36582 |
| | | | ID 36584 | 1 36586 | GDT 36588 | TransmissionID 36590 |
| | | | PackageOrdinal NumberValue 36592 | 1 36594 | GDT 36596 | OrdinalNumberValue 36598 |
| | | | PackageCompleted Indicator 36500A | 1 36502A | GDT 36504A | BusinessTransaction CompletedIndicator 36506A |

FIG. 367A

| Package 36700 | L1 36702 | L2 36704 | L3 36706 | Conf. 36708 | Type 36710 | Name 36712 |
|---|---|---|---|---|---|---|
| Catalogue Publication Confirmation Message 36716 | Catalogue Publication Confirmation Message 36718 | | | | GDT 36720 | Catalogue Publication Confirmation Message 36722 |
| MessageHeader 36724 | | Message Header 36730 | | 1 36732 | GDT 36734 | Business Document Message Header 36736 |
| | | | ID 36740 | 1 36742 | GDT 36744 | Business Document MessageID 36746 |
| | | | Creation DateTime 36748 | 1 36750 | GDT 36752 | DateTime 36754 |
| | | | Sender Party 36756 | 0..1 36758 | GDT 36760 | Business Document Message HeaderParty 36762 |

Fig. 367B

| Catalogue Publication Confirmation Message 36716 | | | | | | |
|---|---|---|---|---|---|---|
| Transmission Information 36726 | | Transmission Header 36764 | | 0..1 36766 | GDT 36768 | Business Document Transmission Header 36770 |
| | | | ID 36774 | 1 36776 | GDT 36778 | Transmission ID 36780 |
| | | Transmission Log 36782 | | 0..1 36784 | | |
| | | | Item 36786 | 1..N 36788 | GDT 36790 | LogItem 36792 |
| Catalogue 36728 | | Catalogue 36794 | | 1 36796 | GDT 36798 | Catalogue Publication Confirmation 36700A |
| | | | ID 36702A | 1 36704A | GDT 36706A | CatalogueID 36708A |
| | | | Publication Completed Indicator 36710A | 1 36712A | GDT 36714A | Business Transaction Completed Indicator 36716A |

FIG. 369A

| Package 36900 | L1 36902 | L2 36904 | L3 36906 | L4 36908 | Conf. 36910 | Type 36912 | Name 36914 |
|---|---|---|---|---|---|---|---|
| Catalogue Publication Transmission Cancellation RequestMessage 36918 | Catalogue Publication Transmission Cancellation RequestMessage 36920 | | | | | GDT 36922 | Catalogue Publication Transmission Cancellation Request Message 36924 |
| Message Header 36926 | | Message Header 36932 | | | 1 36934 | GDT 36936 | Business Document Message Header 36938 |
| | | | ID 36942 | | 1 36944 | GDT 36946 | Business Document MessageID 36948 |
| | | | Creation DateTime 36950 | | 1 36952 | GDT 36954 | DateTime 36956 |
| | | | Sender Party 36958 | | 0..1 36960 | GDT 36962 | Business Document Message HeaderParty 36964 |

FIG. 369B

| Catalogue Publication Transmission Cancellation Request Message 36918 | | | | | | |
|---|---|---|---|---|---|---|
| Transmission Information 36928 | Transmission Header 36966 | | | 0..1 36968 | GDT 36970 | Business Document Transmission Header 36972 |
| | | MinimalRequested LogItemSeverity Code 36976 | | 0..1 36978 | GDT 36980 | LogItem SeverityCode 36982 |
| Catalogue Publication Transmission 36930 | Catalogue Publication Transmission 36984 | | | 1 36986 | GDT 36988 | Catalogue Publication Transmission Cancellation Request 36990 |
| | | ID 36992 | | 1 36994 | GDT 36996 | Transmission ID 36998 |
| Catalogue 36900A | | Catalogue 36902A | | 1 36904A | | |
| | | | ID 36906A | 1 36908A | GDT 36910A | CatalogueID 36912A |

FIG. 371A

| Package 37100 | L1 37102 | L2 37104 | L3 37106 | L4 37108 | Card. 37110 | Type 37112 | Name 37114 |
|---|---|---|---|---|---|---|---|
| Catalogue Publication Transmission Cancellation Confirmation Message 37118 | Catalogue Publication Transmission Cancellation Confirmation Message 37120 | | | | | GDT 37122 | CataloguePublication TransmissionCancellation ConfirmationMessage 37124 |
| Message Header 37126 | | Message Header 37132 | | | 1 37134 | GDT 37136 | BusinessDocument MessageHeader 37138 |
| | | | ID 37142 | | 1 37144 | GDT 37146 | BusinessDocument MessageID 37148 |
| | | | Creation DateTime 37150 | | 1 37152 | GDT 37154 | DateTime 37156 |

FIG. 371B

Catalogue Publication Transmission Cancellation Request Message 37118

| | | | | | | |
|---|---|---|---|---|---|---|
| Message Header 37126 | | SenderParty 37158 | | 0..1 37160 | GDT 37162 | Business Document Message HeaderParty 37164 |
| Transmission Information 37128 | Transmission Header 37166 | | | 0..1 37168 | | |
| | | Item 37170 | | 1..n 37172 | GDT 37174 | LogItem 37176 |
| Catalogue Publication Transmission 37130 | Catalogue Publication Transmission 37178 | | | 1 37180 | GDT 37182 | Catalogue Publication Transmission Cancellation Confirmation 37184 |
| | | ID 37186 | | 1 37188 | GDT 37190 | Transmission ID 37192 |
| | | Cancellation Completed Indicator 37194 | | 1 37196 | GDT 37198A | Business Transaction Completed Indicator 37100A |
| Catalogue 37102A | | Catalogue 37104A | | 1 37106A | | |
| | | | ID 37108A | 1 37110A | GDT 37112A | CatalogueID 37114A |

FIG. 373A

| Package 37300 | L1 37302 | L2 37304 | L3 37306 | L4 37308 | L5 37310 | L6 37312 | Card. 37314 | Type 37316 | Name 37318 |
|---|---|---|---|---|---|---|---|---|---|
| Catalogue Publication Transmission ItemLock Request Message 37320 | Catalogue Publication Trans-mission ItemLock Request Message 37322 | | | | | | | GDT 37323 | CataloguePublication TransmissionItem LockRequest Message 37324 |
| Message Header 37326 | | Message Header 37332 | | | | | 1 37334 | GDT 37336 | BusinessDocument MessageHeader 37338 |
| | | | ID 37340 | | | | 1 37342 | GDT 37344 | BusinessDocument MessageID 37346 |
| | | | Creation Date Time 37348 | | | | 1 37350 | GDT 37352 | DateTime 37354 |
| | | | Sender Party 37356 | | | | 0..1 37358 | GDT 37360 | BusinessDocument MessageHeader Party 37362 |

FIG. 373B

Catalogue Publication Transmission ItemLock Request Message 37320

| | | | | | | |
|---|---|---|---|---|---|---|
| Transmission Information 37328 | Transmission Header 37364 | | | 0..1 37366 | GDT 37368 | Business Document Transmission Header 37370 |
| | | Minimal Requested LogItem Severity Code 37372 | | 0..1 37374 | GDT 37376 | LogItemSeverityCode 37378 |
| Catalogue Publication Transmission 37330 | Catalogue Publication Transmission 37380 | | | 1 37382 | GDT 37384 | CataloguePublication TransmissionItemLock Request 37386 |
| | | ID 37388 | | 1 37390 | GDT 37392 | Transmission ID 37394 |
| Catalogue 37396 | | Catalogue 37398 | | 1 37300A | | |
| | | | ID 37302A | 1 37304A | GDT 37306A | CatalogueID 37308A |
| Content 37310A | | | Content 37312A | 1 37314A | | |

FIG. 373C

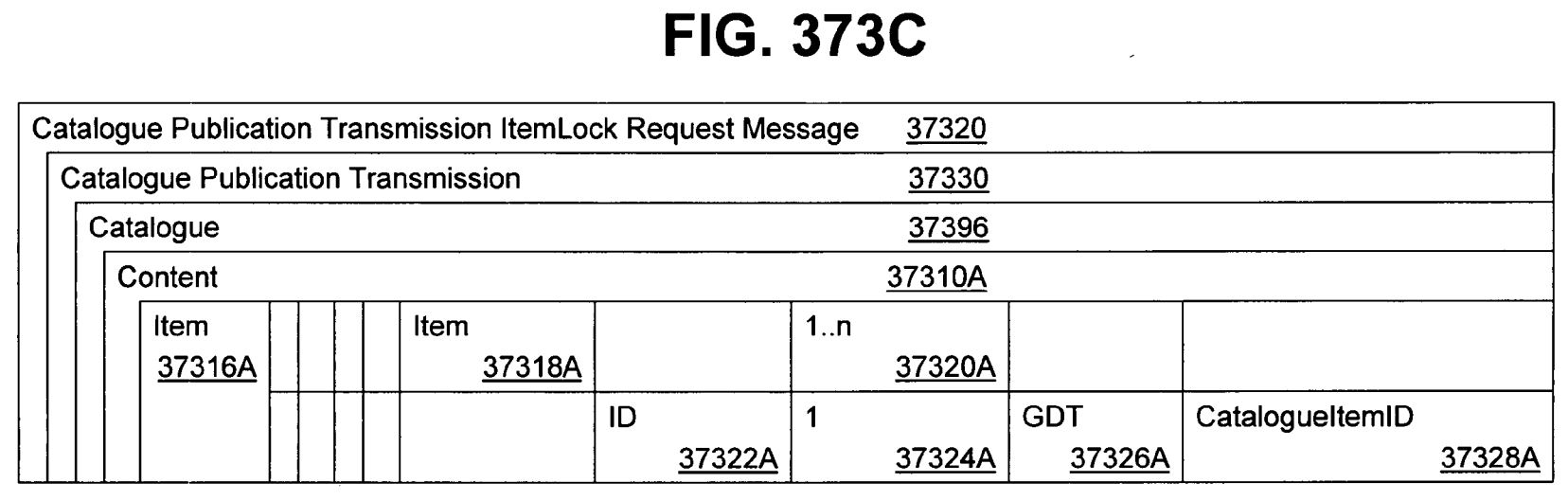

Catalogue Publication Transmission ItemLock Request Message 37320

Catalogue Publication Transmission 37330

Catalogue 37396

Content 37310A

| | | | | |
|---|---|---|---|---|
| Item 37316A | Item 37318A | | 1..n 37320A | | |
| | | ID 37322A | 1 37324A | GDT 37326A | CatalogueItemID 37328A |

FIG. 375A

| Package 37500 | L1 37502 | L2 37504 | L3 37506 | L4 37508 | Card. 37510 | Type 37512 | Name 37514 |
|---|---|---|---|---|---|---|---|
| Catalogue Publication Transmission ItemLock Confirmation Message 37518 | Catalogue Publication Transmission ItemLock Confirmation Message 37520 | | | | | GDT 37522 | CataloguePublication TransmissionItemLock ConfirmationMessage 37524 |
| Message Header 37526 | | Message Header 37532 | | | 1 37534 | GDT 37536 | BusinessDocument MessageHeader 37538 |
| | | | ID 37542 | | 1 37544 | GDT 37546 | BusinessDocument MessageID 37548 |
| | | | Creation DateTime 37550 | | 1 37552 | GDT 37554 | DateTime 37556 |

FIG. 375B

| Catalogue Publication Transmission Cancellation Request Message 37518 | | | | | | |
|---|---|---|---|---|---|---|
| Message Header 37526 | | SenderParty 37558 | | 0..1 37560 | GDT 37562 | BusinessDocument MessageHeaderParty 37564 |
| Transmission Information 37528 | Transmission Log 37566 | | | 0..1 37568 | | |
| | | Item 37570 | | 1..n 37572 | GDT 37574 | LogItem 37576 |
| Catalogue Publication Transmission 37530 | Catalogue Publication Transmission 37578 | | | 1 37580 | GDT 37582 | CataloguePublication TransmissionItemLock Confirmation 37584 |
| | | ID 37586 | | 1 37588 | GDT 37590 | TransmissionID 37592 |
| | | ItemLockCompleted Indicator 37594 | | 1 37596 | GDT 37598 | BusinessTransaction CompletedIndicator 37500A |
| Catalogue 37502A | | Catalogue 37504A | | 1 37506A | | |
| | | | ID 37508A | 1 37510A | GDT 37512A | CatalogueID 37514A |

FIG. 378A

| Package 37800 | L1 37802 | L2 37804 | L3 37806 | L4 37808 | L5 37810 | Occ. 37812 | Data Type 37814 |
|---|---|---|---|---|---|---|---|
| Purchase Order Information Message 37816 | Purchase Order Information Message 37818 | | | | | | PurchaseOrderInformation Message 37820 |
| Message Header 37822 | | Message Header 37826 | | | | 1 37828 | BusinessDocumentMessage Header 37830 |
| | | | ID 37832 | | | 1 37834 | BusinessDocumentMessageID 37836 |
| | | | Reference ID 37838 | | | 0..1 37840 | BusinessDocumentMessageID 37842 |
| | | | Creation DateTime 37844 | | | 1 37846 | DateTime 37848 |
| | | | Sender Party 37850 | | | 0..1 37852 | BusinessDocumentMesssage Party 37854 |
| | | | | Internal ID 37856 | | 0..1 37858 | PartyInternalID 37860 |

FIG. 378B

| PurchaseOrderInformationMessage 37816 | | | | | | | |
|---|---|---|---|---|---|---|---|
| Message Header 37822 | | | | StandardID 37862 | | 0..n 37864 | PartyStandardID 37866 |
| | | | | Contact Person 37868 | | 0..1 37870 | ContactPerson 37872 |
| | | | | | BuyerID 37874 | 0..1 37876 | ContactPersonPartyID 37878 |
| | | | | | SellerID 37880 | 0..1 37882 | ContactPersonPartyID 37884 |
| | | | | | Address 37886 | 0..1 37888 | Address 37890 |
| | | | Recipient Party 37892 | | | 0..n 37894 | BusinessDocumentMessage Party 37896 |
| Purchase Order Information 37824 | | Purchase Order Information 37898 | | | | 1 37800A | PurchaseOrderInformation 37802A |
| | | | ID 37804A | | | 1 37806A | BusinessTransactionDocument ID 37808A |

FIG. 378C

| PurchaseOrderInformationMessage 37816 | | | | | |
|---|---|---|---|---|---|
| Purchase Order Information 37824 | PostingDateTime 37810A | | | 0..1 37812A | DateTime 37814A |
| | LastChangeDate Time 37816A | | | 0..1 37818A | DateTime 37820A |
| | Note 37822A | | | 0..1 37824A | Note 37826A |
| Party 37828A | BuyerParty 37844A | | | 1 37846A | BusinessTransaction DocumentParty 37848A |
| | | StandardID 37850A | | 0..n 37852A | PartyStandardID 37854A |
| | | BuyerID 37856A | | 0..1 37858A | PartyPartyID 37860A |
| | | SellerID 37862A | | 0..1 37864A | PartyPartyID 37866A |
| | | Address 37868A | | 0..1 37870A | Address 37872A |
| | | ContactPerson 37874A | | 0..1 37876A | ContactPerson 37878A |
| | | | BuyerID 37880A | 0..1 37882A | ContactPersonPartyID 37884A |

FIG. 378D

| | | | | |
|---|---|---|---|---|
| PurchaseOrderInformationMessage 37816 | | | | |
| PurchaseOrderInformation 37824 | | | | |
| Party 37828A | | SellerID 37886A | 0..1 37888A | ContactPersonPartyID 37890A |
| | | Address 37892A | 0..1 37894A | Address 37896A |
| | SellerParty 37898A | | 1 37800B | BusinessTransactionDocumentParty 37802B |
| | ProductRecipient Party 37804B | | 0..1 37806B | BusinessTransactionDocumentParty 37808B |
| | VendorParty 37810B | | 0..1 37812B | BusinessTransactionDocumentParty 37814B |
| | ManufacturerParty 37816B | | 0..1 37818B | BusinessTransactionDocumentParty 37820B |
| | BillToParty 37822B | | 0..1 37824B | BusinessTransactionDocumentParty 37826B |
| | PayerParty 37828B | | 0..1 37830B | BusinessTransactionDocumentParty 37832B |
| | CarrierParty 37834B | | 0..1 37836B | BusinessTransactionDocumentParty 37838B |

FIG. 378E

PurchaseOrderInformationMessage 37816

PurchaseOrderInformation 37824

| | | | | |
|---|---|---|---|---|
| Location 37830A | ShipToLocation 37840B | | 0..1 37842B | BusinessTransactionDocumentLocation 37844B |
| | | StandardID 37846B | 0..n 37848B | LocationStandardID 37850B |
| | | BuyerID 37852B | 0..1 37854B | LocationPartyID 37856B |
| | | SellerID 37858B | 0..1 37860B | LocationPartyID 37862B |
| | | Address 37864B | 0..1 37866B | Address 37868B |
| | ShipFrom Location 37870B | | 0..1 37872B | BusinessTransactionDocumentLocation 37874B |
| Delivery Information 37832A | DeliveryTerms 37876B | | 0..1 37878B | DeliveryTerms 37880B |
| | | DeliveryItem GroupID 37882B | 0..1 37884B | BusinessTransactionDocumentItemGroup ID 37886B |
| | | DeliveryPriority Code 37888B | 0..1 37890B | BusinessTransactionPriorityCode 37892B |

FIG. 378F

| | | | | |
|---|---|---|---|---|
| PurchaseOrderInformationMessage 37816 | | | | |
| PurchaseOrderInformation 37824 | | | | |
| Delivery Information 37832A | Incoterms 37894B | | 0..1 37896B | Incoterms 37898B |
| | PartialDelivery 37800C | | 0..1 37802C | PartialDelivery 37804C |
| | Quantity Tolerance 37806C | | 0..1 37808C | QuantityTolerance 37810C |
| | Transport 37812C | | 0..1 37814C | |
| | | ServiceLevel Code 37816C | 0..1 37818C | TransportServiceLevelCode 37820C |
| | | ModeCode 37822C | 0..1 37824C | TransportModeCode 37826C |
| | | Means Description Code 37828C | 0..1 37830C | TransportMeansDescription Code 37832C |
| | Description 37834C | | 0..1 37836C | Description 37838C |

FIG. 378G

| | | | | |
|---|---|---|---|---|
| PurchaseOrderInformationMessage 37816 | | | | |
| PurchaseOrderInformation 37824 | | | | |
| Payment Information 37834A | CashDiscountTerms 37840c | | 0..1 37842C | CashDiscountTerms 37844C |
| | | PaymentBaselineDate 37846C | 0..1 37848C | Date 37850C |
| | | MaximumCashDiscount 37852C | 0..1 37854C | CashDiscount 37856C |
| | | NormalCashDiscount 37858C | 0..1 37860C | CashDiscount 37862C |
| | | FullPaymentDueDaysValue 37864C | 0..1 37866C | |
| | PaymentForm 37868C | | 0..1 37870C | |
| | | Code 37872C | 1 37874C | PaymentFormCode 37876C |
| | | PaymentCard 37878C | 0..1 37880C | PaymentCard 37882C |
| Attachment 37836A | AttachmentWeb Address 37884C | | 0..n 37886C | WebAddress 37888C |

FIG. 378H

PurchaseOrderInformationMessage 37816

PurchaseOrderInformation 37824

| | | | | |
|---|---|---|---|---|
| Attachment 37836A | InternalAttachmentWeb Address 37890C | | 0..n 37892C | WebAddress 37894C |
| Description 37838A | Description 37896C | | 0..1 37898C | Description 37800D |
| | InternalDescription 37802D | | 0..1 37804D | Description 37806D |
| FollowUp Message 37840A | FollowUpPurchaseOrder Confirmation 37808D | | 0..1 37810D | |
| | | Require-mentCode 37812D | 1 37814D | FollowUpMessageRequirementCode 37816D |
| | FollowUpDespatched DeliveryNotification 37818D | | 0..1 37820D | |
| | | Require-mentCode 37822D | 1 37824D | FollowUpMessageRequirementCode 37826D |
| | FollowUpService AcknowledgementRequest 37828D | | 0..1 37830D | |

FIG. 378I

| | | | | |
|---|---|---|---|---|
| PurchaseOrderInformationMessage 37816 | | | | |
| PurchaseOrderInformation 37824 | | | | |
| FollowUp Message 37840A | | RequirementCode 37832D | 1 37834D | FollowUpMessageRequirementCode 37836D |
| | FollowUp InvoiceRequest 37838D | | 0..1 37840D | |
| | | RequirementCode 37842D | 1 37844D | FollowUpMessageRequirementCode 37846D |
| | | EvaluatedReceipt SettlementIndicator 37848D | 0..1 37850D | EvaluatedReceiptSettlementIndicator 37852D |
| Item 37842A | Item 37854D | | 1..n 37856D | PurchaseOrderInformationItem 37858D |
| | | ID 37860D | 1 37862D | BusinessTransactionDocumentItemID 37864D |
| | | ConfirmedInformation OutdatedIndicator 37866D | 0..1 37868D | InformationOutdatedIndicator 37870D |
| | | HierarchyRelationship 37872D | 0..1 37874D | |

FIG. 378J

| | | | | |
|---|---|---|---|---|
| PurchaseOrderInformationMessage 37816 | | | | |
| PurchaseOrderInformation 37824 | | | | |
| Item 37842A | | ParentItemID 37876D | 1 37878D | BusinessTransactionDocumentItemID 37880D |
| | | TypeCode 37882D | 1 37884D | BusinessTransactionDocumentItem HierarchyRelationshipTypeCode 37886D |
| Product Information 37888D | Product 37806E | | 0..1 37808E | BusinessTransactionDocument Product 37810E |
| | | StandardID 37812E | 0..n 37814E | ProductStandardID 37816E |
| | | BuyerID 37818E | 0..1 37820E | ProductPartyID 37822E |
| | | SellerID 37824E | 0..1 37826E | ProductPartyID 37828E |
| | | ManufacturerID 37830E | 0..1 37832E | ProductPartyID 37834E |
| | | TypeCode 37836E | 0..1 37838E | ProductTypeCode 37840E |
| | | Note 37842E | 0..1 37844E | Note 37846E |

FIG. 378K

| | | | | |
|---|---|---|---|---|
| PurchaseOrderInformationMessage 37816 | | | | |
| PurchaseOrderInformation 37824 | | | | |
| Item 37842A | | | | |
| Product Information 37888D | ProductCategory 37848E | | 0..1 37850E | BusinessTransactionDocument ProductCategory 37852E |
| | | Standard ID 37854E | 0..n 37856E | ProductCategoryStandardID 37858E |
| | | BuyerID 37860E | 0..1 37862E | ProductCategoryPartyID 37864E |
| | | SellerID 37866E | 0..1 37868E | ProductCategoryPartyID 37870E |
| Price Information 37890D | Price 37872E | | 0..1 37874E | |
| | | NetUnitPrice 37876E | 0..1 37878E | Price 37880E |
| | ConfirmedPrice 37882E | | 0..1 37884E | |
| | | NetUnitPrice 37886E | 0..1 37888E | Price 37890E |

FIG. 378L

| | | | |
|---|---|---|---|
| PurchaseOrderInformationMessage 37816 | | | |
| PurchaseOrderInformation 37824 | | | |
| Item 37842A | | | |
| Price Information 37890D | ProcurementCostUpperLimit 37892E | 0..1 37894E | ProcurementCostUpperLimit 37896E |
| Party 37892D | BuyerParty 37898E | 0..1 37800F | BusinessTransactionDocumentParty 37802F |
| | SellerParty 37804F | 0..1 37806F | BusinessTransactionDocumentParty 37808F |
| | ProductRecipientParty 37810F | 0..1 37812F | BusinessTransactionDocumentParty 37814F |
| | VendorParty 37816F | 0..1 37818F | BusinessTransactionDocumentParty 37820F |
| | ManufacturerParty 37822F | 0..1 37824F | BusinessTransactionDocumentParty 37826F |
| | BillToParty 37828F | 0..1 37830F | BusinessTransactionDocumentParty 37832F |
| | PayerParty 37834F | 0..1 37836F | BusinessTransactionDocumentParty 37838F |
| | CarrierParty 37840F | 0..1 37842F | BusinessTransactionDocumentParty 37844F |

FIG. 378M

| | | | | |
|---|---|---|---|---|
| PurchaseOrderInformationMessage 37816 | | | | |
| PurchaseOrderInformation 37824 | | | | |
| Item 37842A | | | | |
| Location 37894D | ShipToLocation 37846F | | 0..1 37848F | BusinessTransactionDocomentLocation 37850F |
| | ShipFromLocation 37852F | | 0..1 37854F | BusinessTransactionDocomentLocation 37856F |
| Delivery Information 37896D | DeliveryTerms 37858F | | 0..1 37860F | DeliveryTerms 37862F |
| Business Transaction Document Reference 37898D | QuoteReference 37864F | | 0..1 37866F | BusinesssTransactionDocument Reference 37868F |
| | | ID 37870F | 1 37872F | BusinessTransactionDocumentID 37874F |
| | | ItemID 37876F | 0..n 37878F | BusinessTransactionDocumentItemID 37880F |
| | PurchaseContract Reference 37882F | | 0..n 37884F | BusinessTransactionDocument Reference 37886F |
| | | ID 37888F | 1 37890F | BusinessTransactionDocumentID 37892F |

FIG. 378N

| | | | |
|---|---|---|---|
| PurchaseOrderInformationMessage 37816 | | | |
| PurchaseOrderInformation 37824 | | | |
| Item 37842A | | | |
| Business Transaction Document Reference 37898D | | | |
| | ItemID 37894F | 0..n 37896F | BusinessTransactionDocumentItemID 37898F |
| OriginPurchase OrderReference 37800G | | 0..1 37802G | BusinessTransactionDocumentReference 37804G |
| | ID 37806G | 1 37808G | BusinessTransactionDocumentID 37810G |
| | ItemID 37812G | 0..n 37814G | BusinessTransactionDocumentItemID 37816G |
| BuyerProduct CatalogReference 37818G | | 0..1 37820G | CatalogReference 37822G |
| | ID 37824G | 1 37826G | CatalogID 37828G |
| | ItemID 37830G | 0..n 37832G | CatalogItemID 37834G |
| SellerProduct CatalogReference 37836G | | 0..1 37838G | CatalogReference 37840G |

FIG. 378O

| | | | | |
|---|---|---|---|---|
| PurchaseOrderInformationMessage 37816 | | | | |
| PurchaseOrderInformation 37824 | | | | |
| Item 37842A | | | | |
| Business Transaction Document Reference 37898D | | ID 37842G | 1 37844G | CatalogID 37846G |
| | | ItemID 37848G | 0..n 37850G | CatalogItemID 37852G |
| Attachment 37800E | AttachmentWebAddress 37854G | | 0..n 37856G | WebAddress 37858G |
| | InternalAttachmentWeb Address 37860G | | 0..n 37862G | WebAddress 37864G |
| Description 37802E | Description 37866G | | 0..1 37868G | Description 37870G |
| | InternalDescription 37872G | | 0..1 37874G | Description 37876G |
| ScheduleLine 37804E | ScheduleLine 37878G | | 0..n 37880G | PurchaseOrderInformationItem ScheduleLine 37882G |
| | | ID 37884G | 0..1 37886G | BusinessTransactionDocument ItemScheduleLineID 37888G |

FIG. 378P

| | | | | |
|---|---|---|---|---|
| PurchaseOrderInformationMessage 37816 | | | | |
| PurchaseOrderInformation 37824 | | | | |
| Item 37842A | | | | |
| ScheduleLine 37804E | | Delivery Period 37890G | 1 37892G | DateTimePeriod 37894G |
| | | Quantity 37896G | 0..n 37898G | Quantity 37800H |
| | ConfirmedScheduleLine 37802H | | 0..n 37804H | PurchaseOrderInformationItem ScheduleLine 37806H |

FIG. 381A

| Package 38100 | L1 38102 | L2 38104 | L3 38106 | L4 38108 | Occ. 38110 | Data Type 38112 |
|---|---|---|---|---|---|---|
| TaxDueMessage 38114 | TaxDue Message 38116 | | | | | GDT:TaxDueMessage 38118 |
| TaxDue 38120 | | TaxDue 38122 | | | 1 38124 | GDT:TaxDue 38126 |
| | | | BaseBusinessTransaction DocumentID 38128 | | 1 38130 | GDT:BusinessTransaction DocumentID 38132 |
| | | | BaseBusinessTransaction DocumentTypeCode 38134 | | 1 38136 | GDT:BusinessTransaction DocumentTypeCode 38138 |
| | | | BaseBusinessTransaction DocumentDate 38140 | | 1 38142 | GDT:Date 38144 |
| | | | ProductTaxEventTypeCode 38146 | | 0..1 38148 | GDT:ProductTaxEventType Code 38150 |
| Party 38152 | | | BuyerParty 38158 | | 0..1 38160 | GDT:BusinessTransaction DocumentParty 38162 |

FIG. 381B

| | | | | | |
|---|---|---|---|---|---|
| TaxDueMessage | | 38114 | | | |
| TaxDue | | 38120 | | | |
| Party 38152 | SellerParty 38164 | | 0..1 38166 | GDT:BusinessTransactionDocumentParty 38168 |
| | Product RecipientParty 38170 | | 0..1 38172 | GDT:BusinessTransactionDocumentParty 38174 |
| | VendorParty 38176 | | 0..1 38178 | GDT:BusinessTransactionDocumentParty 38180 |
| | DebitorParty 38182 | | 0..1 38184 | GDT:BusinessTransactionDocumentParty 38186 |
| | CreditorParty 38188 | | 0..1 38190 | GDT:BusinessTransactionDocumentParty 38192 |
| Tax 38154 | ProductTax 38194 | | 1..n 38196 | GDT:ProductTax 38198 |
| Item 38156 | Item 38100A | | 1..n 38102A | GDT:TaxDueItem 38104A |

FIG. 381C

| | | | | |
|---|---|---|---|---|
| TaxDueMessage 38114 | | | | |
| TaxDue 38120 | | | | |
| Item 38156 | BaseBusinessTransactionDocumentItemID 38106A | 1 38108A | GDT:BusinessTransactionDocumentItemID 38110A |
| | BaseBusinessTransactionDocumentItemTypeCode 38112A | 0..1 38114A | GDT:BusinessTransactionDocumentItemTypeCode 38116A |
| | BaseBusinessTransactionDocumentDeliveryDate 38118A | 0..1 38120A | GDT:Date 38122A |
| | ProductTaxEventTypeCode 38124A | 0..1 38126A | GDT:ProductTaxEventTypeCode 38128A |
| Party 38130A | BuyerParty 38134A | 0..1 38136A | GDT:BusinessTransactionDocumentParty 38138A |
| | SellerParty 38140A | 0..1 38142A | GDT:BusinessTransactionDocumentParty 38144A |
| | ProductRecipientParty 38146A | 0..1 38148A | GDT:BusinessTransactionDocumentParty 38150A |
| | VendorParty 38152A | 0..1 38154A | GDT:BusinessTransactionDocumentParty 38156A |
| | DebitorParty 38158A | 0..1 38160A | GDT:BusinessTransactionDocumentParty 38162A |

FIG. 381D

| | | | | | | | |
|---|---|---|---|---|---|---|---|
| TaxDueMessage 38114 | | | | | | | |
| | TaxDue 38120 | | | | | | |
| | | Item 38156 | | | | | |
| | | | Party 38130A | | CreditorParty 38164A | 0..1 38166A | GDT:BusinessTransactionDocumentParty 38168A |
| | | | Tax 38132A | | ProductTax 38170A | 1..n 38172A | GDT:ProductTax 38174A |

FIG. 384A

| Package 38400 | L1 38402 | L2 38404 | L3 38406 | L4 38408 | L5 38410 | Occ. 38412 | Data Type 38414 |
|---|---|---|---|---|---|---|---|
| DeliveryInformation Message 38416 | Delivery Information Message 38418 | | | | | | Delivery Information 38420 |
| MessageHeader 38422 | | Message Header 38426 | | | | 0..1 38428 | MessageHeader 38430 |
| Delivery 38424 | | Delivery 38432 | | | | 1 38434 | |
| | | | ID 38436 | | | 1 38438 | BusinessTransaction DocumentID 38440 |
| | | | TypeCode 38442 | | | 1 38444 | BusinessTransaction DocumentTypeCode 38446 |
| | | | Deleted Indicator 38448 | | | 0..1 38450 | DeletedIndicator 38452 |
| | | | CreationDate Time 38454 | | | 1 38456 | DateTime 38458 |

FIG. 384B

| DeliveryInformationMessage 38416 | | | | |
| --- | --- | --- | --- | --- |
| Delivery 38424 | LastChangeDateTime 38460 | | 0..1 38462 | DateTime 38464 |
| | GroupID 38466 | | 0..1 38468 | BusinessTransaction DocumentGroupID 38470 |
| | GrossWeightMeasure 38472 | | 0..1 38474 | Measure 38476 |
| | NetWeightMeasure 38478 | | 0..1 38480 | Measure 38482 |
| | VolumeMeasure 38484 | | 0..1 38486 | Measure 38488 |
| Execution Information 38490 | ExecutionStatus 38406A | | 0..1 38408A | |
| | | DeliveryExecutionStatus Code 38410A | 0..1 38412A | BusinessTransaction ExecutionStatusCode 38414A |
| | | PickingExecutionStatus Code 38416A | 0..1 38418A | BusinessTransaction ExecutionStatusCode 38420A |
| | | IssueExecutionStatus Code 38422A | 0..1 38424A | BusinessTransaction ExecutionStatusCode 38426A |

FIG. 384C

| | | | | |
|---|---|---|---|---|
| DeliveryInformationMessage 38416 | | | | |
| Delivery 38424 | | | | |
| Execution Information 38490 | | PutawayExecutionStatus Code 38428A | 0..1 38430A | BusinessTransaction ExecutionStatusCode 38432A |
| | | ReceiptExecution StatusCode 38434A | 0..1 38436A | BusinessTransaction ExecutionStatusCode 38438A |
| | ExecutionPeriod 38440A | | 0..1 38442A | |
| | | PickingPeriod 38444A | 0..1 38446A | DateTimePeriod 38448A |
| | | IssuePeriod 38450A | 0..1 38452A | DateTimePeriod 38454A |
| | | DeliveryPeriod 38456A | 0..1 38458A | DateTimePeriod 38460A |
| | | PutawayPeriod 38462A | 0..1 38464A | DateTimePeriod 38466A |
| | | ReceiptPeriod 38468A | 0..1 38470A | DateTimePeriod 38472A |
| Party 38492 | ProductReclplentParty 38474A | | 1 38476A | BusinessTransaction DocumentParty 38478A |

FIG. 384D

| | | | | | | |
|---|---|---|---|---|---|---|
| DeliveryInformationMessage 38416 | | | | | | |
| Delivery 38424 | | | | | | |
| Party 38492 | | InternalID 38480A | | 0..1 38482A | PartyInternalID 38484A |
| | | Address 38486A | | 0..1 38488A | Address 38490A |
| | | Contact 38492A | | 0..1 38494A | BusinessTransactionDocumentContact 38496A |
| | | | InternalID 38498A | 0..1 38400B | PartyInternalID 38402B |
| | | | Address 38404B | 0..1 38406B | Address 38408B |
| | VendorParty 38410B | ... 38412B | | 0..1 38414B | BusinessTransactionDocumentParty 38416B |
| | CarrierParty 38418B | ... 38420B | | 0..1 38422B | BusinessTransactionDocumentParty 38424B |
| Location 38494 | ShipToLocation 38426B | | | 1 38428B | BusinessTransactionDocumentLocation 38430B |
| | | | InternalID 38432B | 0..1 38434B | LocationInternalID 38436B |
| | | | Address 38438B | 0..1 38440B | Address 38442B |

FIG. 384E

| | | | | | | | |
|---|---|---|---|---|---|---|---|
| DeliveryInformationMessage 38416 | | | | | | | |
| Delivery 38424 | | | | | | | |
| Location 38494 | | | | | Note 38444B | 0..1 38446B | Note 38448B |
| | | | ShipFromLocation 38450B | ... 38452B | | 0..1 38454B | BusinessTransaction DocumentLocation 38456B |
| Transportation Information 38496 | | | TransportMeans 38458B | | | 0..1 38460B | TransportMeans 38462B |
| BusinessTrans-actionDocument Reference 38498 | | | DespatchedDelivery Reference 38464B | | | 0..1 38466B | BusinessTransaction DocumentReference 38468B |
| | | | ShipmentReference 38470B | | | 0..1 38472B | BusinessTransaction DocumentReference 38474B |
| Attachment 38400A | | | AttachmentWeb Address 38476B | | | 0..n 38478B | WebAddress 38480B |
| Description 38402A | | | Description 38482B | | | 0..n 38484B | Description 38486B |
| DeliveryItem 38404A | | | DeliveryItem 38488B | | | 1..n 38490B | |

FIG. 384F

| | | | |
|---|---|---|---|
| DeliveryInformationMessage 38416 | | | |
| Delivery 38424 | | | |
| DeliveryItem 38404A | | | |
| ID 38492B | | 1 38494B | BusinessTransaction DocumentItemID 38496B |
| TypeCode 38498B | | 0..1 38400C | BusinessTransaction DocumentItemTypeCode 38402C |
| CreationDateTime 38404C | | 1 38406C | DateTime 38408C |
| LastChangeDateTime 38410C | | 0..1 38412C | DateTime 38414C |
| GroupID 38416C | | 0..1 38418C | BusinessTransactionDocument ItemGroupID 38420C |
| HierarchyRelationship 38422C | | 0..1 38424C | |
| | ParentItemId 38426C | 0..1 38428C | BusinessTransactionDocument ItemID 38430C |
| | TypeCode 38432C | 1 38434C | BusinessTransactionDocument ItemHierarchyRelationship TypeCode 38436C |

FIG. 384G

| | | | | |
|---|---|---|---|---|
| DeliveryInformationMessage 38416 | | | | |
| Delivery 38424 | | | | |
| DeliveryItem 38404A | Quantity 38438C | | 1 38440C | Quantity 38442C |
| | SalesOrderQuantity 38444C | | 0..1 38446C | Quantity 38448C |
| | PurchaseOrderQuantity 38450C | | 0..1 38452C | Quantity 38454C |
| | InventoryQuantity 38456C | | 0..1 38458C | Quantity 38460C |
| | CompletedIndicator 38462C | | 0..1 38464C | BusinesssTransaction CompletedIndicator 38466C |
| Execution Information 38468C | ExecutionStatus 38480C | | 0..1 38482C | |
| | | DeliveryExecution StatusCode 38484C | 0..1 38486C | BusinessTransactionExecution StatusCode 38488C |
| | | PickingExecution StatusCode 38490C | 0..1 38492C | BusinessTransactionExecution StatusCode 38494C |

FIG. 384H

| | | | | |
|---|---|---|---|---|
| DeliveryInformationMessage | 38416 | | | |
| Delivery | 38424 | | | |
| DeliveryItem | 38404A | | | |
| Execution Information 38468C | | IssueExecution StatusCode 38496C | 0..1 38498C | BusinessTransactionExecution StatusCode 38400D |
| | | PutawayExecution StatusCode 38402D | 0..1 38404D | BusinessTransactionExecution StatusCode 38406D |
| | | ReceiptExecution StatusCode 38408D | 0..1 38410D | BusinessTransactionExecution StatusCode 38412D |
| | ExecutionPeriod 38414D | | 0..1 38416D | |
| | | PickingPeriod 38418D | 0..1 38420D | DateTimePeriod 38422D |
| | | IssuePeriod 38424D | 0..1 38426D | DateTimePeriod 38428D |
| | | DeliveryPeriod 38430D | 0..1 38432D | DateTimePeriod 38434D |
| | | PutawayPeriod 38436D | 0..1 38438D | DateTimePeriod 38440D |

FIG. 384I

| | | | | |
|---|---|---|---|---|
| DeliveryInformationMessage 38416 | | | | |
| Delivery 38424 | | | | |
| DeliveryItem 38404A | | | | |
| Execution Information 38468C | | ReceiptPeriod 38442D | 0..1 38444D | DateTimePeriod 38446D |
| Product Information 38470C | Product 38448D | | 1 38450D | BusinessTransactionDocument Product 38452D |
| | | InternalID 38454D | 0..1 38456D | ProductInternalID 38458D |
| | | StandardID 38460D | 0..1 38462D | ProductStandardID 38464D |
| | | ShipToID 38466D | 0..1 38468D | ProductPartyID 38470D |
| | | ShipFromID 38472D | 0..1 38474D | ProductPartyID 38476D |
| | | Description 38478D | 0..1 38480D | Note 38482D |
| Batch 38472C | Batch 38484D | | 0..1 38486D | Batch 38488D |
| | | BatchID 38490D | 0..1 38492D | BatchID 38494D |

FIG. 384J

| | | | |
|---|---|---|---|
| DeliveryInformationMessage 38416 | | | |
| Delivery 38424 | | | |
| DeliveryItem 38404A | | | |
| BusinessTransactionDocument Reference 38474C | PurchaseOrderReference 38496D | 0..1 38498D | BusinessTransactionDocument Reference 38400E |
| | SalesOrderReference 38402E | 0..1 38404E | BusinessTransactionDocument Reference 38406E |
| | PendingDeliveryReference 38408E | 0..n 38410E | BusinessTransactionDocument Reference 38412E |
| | DespatchedDelivery NotificationReference 38414E | 0..1 38416E | BusinessTransactionDocument Reference 38418E |
| | ShipmentReference 38420E | 0..1 38422E | BusinessTransactionDocument Reference 38424E |
| Attachment 38476C | AttachmentWebAddress 38426E | 0..n 38428E | WebAddress 38430E |
| Description 38478C | Description 38432E | 0..n 38434E | Description 38436E |

FIG. 387A

| Package 38700 | L1 38702 | L2 38704 | L3 38706 | L4 38708 | L5 38710 | Occ. 38712 | Data Type 38714 |
|---|---|---|---|---|---|---|---|
| PersonnelTime SheetMessage 38722 | PersonnelTime SheetMessage 38724 | | | | | | GDT: PersonnelTime SheetMessage 38726 |
| Message Header 38734 | | Message Header 38738 | | | | 0..1 38740 | GDT: BusinessDocument MessageHeader 38742 |
| | | | MessageID 38744 | | | 1 38746 | GDT: Message ID 38748 |
| | | | Creation DateTime 38754 | | | 1 38756 | GDT: DateTime 38758 |
| | | | Sender Party 38766 | | | 0..1 38768 | GDT: BusinessDocument MessageHeaderParty 38770 |
| | | | Recipient Party 38778 | | | 0..1 38780 | GDT: BusinessDocument MessageHeaderParty 38782 |
| Personnel TimeSheet 38736 | | Personnel TimeSheet 38786 | | | | 1 38788 | GDT: PersonnelTime Sheet 38790 |

FIG. 387B

| PersonnelTimeSheetMessage 38722 | | | | | |
|---|---|---|---|---|---|
| Personnel TimeSheet 38736 | Personnel ResourceID 38798 | | | 1 38700A | GDT: PartyInternalID 38702A |
| Personnel Time Subsheet 38708A | PersonnelTime Subsheet 38710A | | | 1..n 38712A | GDT: PersonnelTime Subsheet 38714A |
| | | Period 38722A | | 1 38724A | GDT: DatePeriod 38726A |
| | | WorkAgreementID 38734A | | 0..1 38736A | GDT: WorkAgreementID 38738A |
| | | PersonnelTime 38746A | | 0..n 38748A | GDT: PersonnelTime 38750A |
| | | | ID 38758A | 0..1 38760A | GDT: PersonnelTimeID 38762A |
| | | | TypeID 38768A | 1 38770A | GDT: PersonnelTime TypeID 38772A |
| | | | DateTimePeriod 38780A | 0..1 38782A | GDT:DateTimePeriod 38784A |
| | | | DatePeriod 38792A | 0..1 38794A | GDT:Date Period 38796A |

FIG. 387C

| | | | |
|---|---|---|---|
| PersonnelTimeSheetMessage 38722 | | | |
| PersonnelTimeSheet 38736 | | | |
| Personnel Time Subsheet 38708A | | | |
| | Duration 38704B | 0..1 38706B | GDT:Duration 38708B |
| | DateForEvaluation 38716B | 0..1 38718B | GDT: Date 38720B |
| PersonnelTimeEvent 38728B | | 0..n 38730B | GDT:PersonnelTimeEvent 38732B |
| | ID 38740B | 0..1 38742B | GDT: PersonnelTime EventID 38744B |
| | TypeID 38750B | 1 38752B | GDT:PersonnelTimeEventTypeID 38754B |
| | DateTime 38762B | 1 38764B | GDT:DateTime 38766B |
| | DateForEvaluation 38774B | 0..1 38776B | GDT:Date 38778B |

FIG. 391A

| Package 39100 | L1 39102 | L2 39104 | L3 39106 | L4 39108 | Occ. 39110 | Datatype 39112 |
|---|---|---|---|---|---|---|
| Credit Worthiness QueryMessage 39114 | CreditWorth-inessQuery Message 39116 | | | | | MDT: CreditWorthiness Query Message 39118 |
| CreditWorthi-nessQuery 39120 | | CreditWorth-inessQuery 39122 | | | 1 39124 | AGDT: CreditWorthiness Query 39126 |
| | | | CreditSegment InternalID 39128 | | 0..1 39130 | GDT: CreditSegment InternalID 39132 |
| | | | CheckedAmount 39134 | | 0..1 39136 | GDT: Amount 39138 |
| | | | CheckingRuleCode 39140 | | 0..1 39142 | GDT: CreditWorthiness CheckingRuleCode 39144 |
| | | | CheckingSeverity Code 39146 | | 0..1 39148 | GDT: CreditWorthiness CheckingSeverityCode 39150 |
| | | | CreditAgency ReportRetrieval Permission Indicator 39152 | | 1 39154 | GDT: Credit Agency ReportRetrieval PermissionIndicator 39156 |

FIG. 391B

| | | | | | | |
|---|---|---|---|---|---|---|
| CreditWorthinessQueryMessage 39114 | | | | | | |
| CreditWorthinessQuery 39122 | | | | | | |
| Party 39158 | | | DebtorParty 39162 | | 1 39164 | GDT: Business TransactionDocument Party 39166 |
| | | | | InternalID 39168 | 1 39170 | GDT: PartyInternalID 39172 |
| | | | CreditorParty 39174 | | 0..1 39176 | GDT: BusinessTransactionDocument Party 39178 |
| | | | | InternalID 39180 | 1 39182 | GDT: PartyInternalID 39184 |
| | | | SellerParty 39186 | | 0..1 39188 | GDT: BusinessTransactionDocument Party 39190 |
| | | | | InternalID 39192 | 1 39194 | GDT: PartyInternalID 39196 |
| Product Information 39160 | | | ProductCategory 39198 | | 0..1 39100A | GDT: BusinessTransactionDocument ProductCategory 39102A |
| | | | | InternalID 39104A | 1 39106A | GDT: ProductCategoryInternalID 39108A |

FIG. 392A

| Package 39200 | L1 39202 | L2 39204 | L3 39206 | L4 39208 | Occ. 39210 | Datatype 39212 |
|---|---|---|---|---|---|---|
| Credit Worthiness Message 39214 | CreditWorthinessMessage 39216 | | | | | MDT: CreditWorthiness Message 39218 |
| CreditWorthiness 39220 | | CreditWorthiness 39222 | | | 1 39224 | AGDT: Credit Worthiness 39226 |
| | | | CreditSegment InternalID 39228 | | 0..1 39230 | GDT: CreditSegment InternalID 39232 |
| | | | Indicator 39234 | | 1 39236 | GDT: CreditWorthiness Indicator 39238 |
| | | | Checking Description 39240 | | 0..n 39242 | GDT: Description 39244 |
| Party 39246 | | | DebtorParty 39252 | | 1 39254 | GDT: Business TransactionDocument Party 39256 |

FIG. 392B

| | | | | | | |
|---|---|---|---|---|---|---|
| CreditWorthinessMessage 39214 | | | | | | |
| CreditWorthiness 39220 | | | | | | |
| Party 39246 | | | | InternalID 39258 | 1 39260 | GDT: PartyInternalID 39262 |
| | | | CreditorParty 39264 | | 0..n 39266 | GDT: BusinessTransaction DocumentParty 39268 |
| | | | | InternalID 39270 | 1 39272 | GDT: PartyInternalID 39274 |
| | | | SellerParty 39276 | | 0..n 39278 | GDT: BusinessTransaction DocumentParty 39280 |
| | | | | InternalID 39282 | 1 39284 | GDT: PartyInternalID 39286 |
| Product Information 39248 | | | ProductCategory 39288 | | 0..n 39290 | GDT: BusinessTransaction DocumentProductCategory 39292 |
| | | | | InternalID 39294 | 1 39296 | GDT: ProductCategoryInternalID 39298 |
| Creditworthi-ness Information 39250 | | | CreditRating 39200A | | 1 39202A | |
| | | | | Code 39204A | 1 39206A | GDT: CreditRatingCode 39208A |

FIG. 392C

| | | | | | |
|---|---|---|---|---|---|
| CreditWorthinessMessage | 39214 | | | | |
| CreditWorthiness | 39220 | | | | |
| Creditworthiness Information 39250 | | | ValidityPeriod 39210A | 0..1 39212A | GDT: DateTimePeriod 39214A |
| | | CreditRiskClass 39216A | | 0..1 39218A | |
| | | | Code 39220A | 1 39222A | GDT: CreditRiskClassCode 39224A |
| | | | ValidityPeriod 39226A | 0..1 39228A | GDT: DateTimePeriod 39230A |
| | | CreditLimit 39232A | | 0..1 39234A | |
| | | | Amount 39236A | 1 39238A | GDT: Amount 39240A |
| | | | ValidityPeriod 39242A | 0..1 39244A | GDT: DateTimePeriod 39246A |

FIG. 396A

| Package 39600 | L1 39602 | L2 39604 | L3 39606 | L4 39608 | Occ. 39610 | Datatype 39612 |
|---|---|---|---|---|---|---|
| CreditAgency ReportQuery Message 39614 | CreditAgency ReportQuery Message 39616 | | | | | MDT: CreditAgency ReportQueryMessage 39618 |
| Message Header 39620 | | Message Header 39624 | | | 1 39626 | GDT: MessageHeader 39628 |
| | | | ID 39630 | | 1 39632 | GDT: Business DocumentMessageID 39634 |
| | | | ReferenceID 39636 | | 0..1 39638 | GDT: Business DocumentMessageID 39640 |
| | | | CreationDate Time 39642 | | 1 39644 | GDT: DateTime 39646 |
| | | | SenderParty 39648 | | 0..1 39650 | GDT: Business DocumentMessage HeaderParty 39652 |

FIG. 396B

| CreditAgencyReportQueryMessage 39614 | | | | | | |
|---|---|---|---|---|---|---|
| Message Header 39620 | | | | InternalID 39654 | 1 39656 | GDT: PartyInternalID 39658 |
| | | | RecipientParty 39660 | | 0..n 39662 | GDT: BusinessDocument MessageHeaderParty 39664 |
| | | | | Internal ID 39666 | 1 39668 | GDT: PartyInternalID 39670 |
| Credit Agency Report Query 39622 | | CreditAgency Report Query 39672 | | | 1 39674 | AGDT: Item 39676 |
| | | | Reason 39678 | | 1 39680 | GDT: CreditAgencyReportQueryReason Code 39682 |
| Party 39684 | | | DebtorParty 39688 | | 1 39690 | GDT: Business Transaction Document Party 39692 |
| | | | | Standard ID 39694 | 0..1 39696 | GDT: Party Standard ID 39698 |
| | | | | Credit Agency ID 39600A | 0..1 39602A | GDT: Party Party ID 39604A |

FIG. 396C

| | | | | | | |
|---|---|---|---|---|---|---|
| CreditAgencyReportQueryMessage 39614 | | | | | | |
| Credit Agency Report Query 39622 | | | | | | |
| Party 39684 | | | | Address 39606A | 0..1 39608A | GDT: Address 39610A |
| | | | | IncorporationDate 39612A | 0..1 39614A | GDT: Date 39616A |
| | | | | BirthDate 39618A | 0..1 39620A | DT: Date 39622A |
| Service 39686 | | | Service 39624A | | 1 39626A | |
| | | | | CreditAgencyID 39628A | 1 39630A | GDT: Product Party ID 39632A |

FIG. 397A

| Package 39700 | L1 39702 | L2 39704 | L3 39706 | L4 39708 | L5 39710 | O. 39712 | Datatype 39714 |
|---|---|---|---|---|---|---|---|
| CreditAgency ReportMessage 39716 | CreditAgency ReportMessage 39718 | | | | | | MDT:CreditAgency ReportMessage 39720 |
| MessageHeader 39722 | | Message Header 39726 | | | | 1 39728 | GDT:MessageHeader 39730 |
| | | | ID 39732 | | | 1 39734 | GDT:Business DocumentMessageID 39736 |
| | | | Reference ID 39738 | | | 0..1 39740 | GDT:Business DocumentMessageID 39742 |
| | | | Creation DateTime 39744 | | | 1 39746 | GDT:DateTime 39748 |
| | | | Sender Party 39750 | | | 0..1 39752 | GDT:Business DocumentMessage HeaderParty 39754 |
| | | | | Internal ID 39756 | | 1 39758 | GDT:PartyInternalID 39760 |

FIG. 397B

| CreditAgencyReportMessage 39716 | | | | | | |
|---|---|---|---|---|---|---|
| MessageHeader 39722 | | RecipientParty 39762 | | | 0..n 39764 | GDT:BusinessDocumentMessageHeaderParty 39766 |
| | | | Internal ID 39768 | | 1 39770 | GDT:PartyInternalID 39772 |
| CreditAgency Report 39724 | CreditAgency Report 39774 | | | | 1 39776 | GDT:CreditAgency Report 39778 |
| CreationLog 39780 | | CreationLog 39788 | | | 0..1 39790 | |
| | | | Item 39792 | | 1..n 39794 | GDT:LogItem 39796 |
| | | | | TypeID 39798 | 0..1 39700A | xsd:token 39702A |
| | | | | Severity Code 39704A | 0..1 39706A | GDT:LogItemSeverity Code 39708A |
| | | | | Note 39710A | 1 39712A | GDT:Note 39714A |

FIG. 397C

| | | | | |
|---|---|---|---|---|
| CreditAgencyReportMessage 39716 | | | | |
| CreditAgencyReport 39724 | | | | |
| Party 39782 | DebtorParty 39716A | | 1 39718A | GDT:BusinessTransaction DocumentParty 39720A |
| | | StandardID 39722A | 0..n 39724A | GDT:PartyStandardID 39726A |
| | | CreditAgencyID 39728A | 0..1 39730A | GDT:PartyPartyID 39732A |
| | | Address 39734A | 1 39736A | GDT:Address 39738A |
| | | IncorporationDate 39740A | 0..1 39742A | GDT:Date 39744A |
| | | BirthDate 39746A | 0..1 39748A | GDT:Date 39750A |
| Credit Worthiness Information 39784 | CreditRating 39752A | | 1 39754A | |
| | | Code 39756A | 1 39758A | GDT:CreditRatingCode 39760A |
| | | ValidityPeriod 39762A | 0..1 39764A | GDT:DatePeriod 39766A |

FIG. 397D

| | | | | |
|---|---|---|---|---|
| CreditAgencyReportMessage 39716 | | | | |
| CreditAgencyReport 39724 | | | | |
| Credit Worthiness Information 39784 | CreditRiskClass 39768A | | 0..1 70A | |
| | | Code 72A | 1 74A | GDT:CreditRiskClassCode 76A |
| | | ValidityPeriod 78A | 0..1 39780A | GDT:DateTimePeriod 39782A |
| | Scoring 39784A | | 0..n 39786A | GDT:CreditAgencyReport Scoring 39788A |
| | | ScoreCardID 39790A | 0..1 39792A | GDT:ScoreCardID 94A |
| | | ResultValue 39796A | 1 39798A | xsd:decimal 39700B |
| | | Description 39702B | 0..1 39704B | GDT:Description 39706B |
| | CreditLimit 39708B | | 0..n 39710B | |
| | | Amount 39712B | 1 39714B | GDT:Amount 39716B |

FIG. 397E

| | | | | |
|---|---|---|---|---|
| CreditAgencyReportMessage 39716 | | | | |
| CreditAgencyReport 39724 | | | | |
| Credit Worthiness Information 39784 | | ValidityPeriod 39718B | 0..1 39720B | GDT:DatePeriod 39722B |
| Legal Information 39786 | LegalEvent 39724B | | 0..n 39726B | |
| | | TypeCode 39728B | 0..1 39730B | GDT:LegalEventTypeCode 39732B |
| | | Date 39734B | 0..1 39736B | GDT:Date 39738B |
| | | Description 39740B | 0..1 39742B | GDT:Description 39744B |

FIG. 400A

| Package 40000 | L1 40002 | L2 40004 | L3 40006 | L4 40008 | Occ. 40010 | Data Type 40012 |
|---|---|---|---|---|---|---|
| Accounting Cancellation Message 40014 | Accounting Cancellation Message 40016 | | | | 1 40018 | |
| Accounting Cancellation 40020 | | Accounting Cancellation 40022 | | | 1 40024 | |
| | | | OriginBusiness Transaction Type 40026 | | 1 40028 | GDT: BusinessTransaction TypeCode 40030 |
| | | | PostingDate 40032 | | 0..1 40034 | GDT: Date 40036 |
| | | | Description 40038 | | 0..1 40040 | GDT: Description 40042 |
| Business Transaction Document Reference 40044 | | | PrimaNota Reference 40046 | | 1 40048 | GDT: BusinessTransaction DocumentReference 40050 |

FIG. 400B

| | | | | | | |
|---|---|---|---|---|---|---|
| Accounting Cancellation Message 40016 | | | | | | |
| Accounting Cancellation 40022 | | | | | | |
| Business Transaction Document Reference 40044 | | | | ID 40052 | 1 40054 | GDT: BusinessTransaction DocumentID 40056 |
| | | | OriginPrima NotaReference 40058 | | 1 40060 | GDT: BusinessTransaction DocumentReference 40062 |
| | | | | ID 40064 | 1 40066 | GDT: BusinessTransaction DocumentID 40068 |

FIG. 404A

| Package 40400 | L1 40402 | L2 40404 | L3 40406 | L4 40408 | L5 40410 | occ. 40412 | Datatype 40414 |
|---|---|---|---|---|---|---|---|
| InvoiceDue Message 40416 | Invoice Due Message 40418 | | | | | | MDT:InvoiceDueMessage 40420 |
| InvoiceDue 40422 | | Invoice Due 40424 | | | | 1 40426 | GDT:InvoiceDue 40428 |
| | | | BaseBusiness Transaction DocumentID 40430 | | | 1 40432 | GDT:BusinessTransaction DocumentID 40434 |
| | | | BaseBusiness DocumentType Code 40436 | | | 1 40438 | GDT:BusinessTransaction DocumentTypeCode 40440 |
| | | | SettlementPriority Code 40442 | | | 0..1 40444 | GDT:BusinessTransaction Priority Code 40446 |
| | | | Settlement Relevance Indicator 40448 | | | 0..1 40450 | GDT:BusinessTransaction DocumentSettlement RelevanceIndicator 40452 |

FIG. 404B

| | | | | |
|---|---|---|---|---|
| InvoiceDueMessage 40416 | | | | |
| InvoiceDue 40422 | SettlementBlockedIndicator 40454 | 0..1 40456 | GDT:BusinessTransactionBlockedIndicator 40458 |
| | ItemListCompleteTransmission Indicator 40460 | 0..1 40462 | GDT:CompleteTransmissionIndicator 40464 |
| | PlannedBilling Date 40466 | 0..1 40468 | GDT:Date 40470 |
| | DeliveryPeriod 40472 | 0..1 40474 | GDT:DateTimePeriod 40476 |
| | ProposedInvoiceDate 40478 | 0..1 40480 | GDT:DateTime 40482 |
| Party 40484 | BuyerParty 40402A | 0..1 40404A | GDT:BusinessTransactionDocumentParty 40406A |
| | SellerParty 40408A | 0..1 40410A | GDT:BusinessTransaction DocumentParty 40412A |
| | ProductRecipientParty 40414A | 0..1 40416A | GDT:BusinessTransactionDocumentParty 40418A |
| | VendorParty 40420A | 0..1 40422A | GDT:BusinessTransactionDocumentParty 40424A |
| | BillToParty 40426A | 0..1 40428A | GDT:BusinessTransactionDocumentParty 40430A |

FIG. 404C

| | | | | |
|---|---|---|---|---|
| InvoiceDueMessage | 40416 | | | |
| InvoiceDue | 40422 | | | |
| Party 40484 | BillFromParty 40432A | 0..1 40434A | GDT:BusinessTransactionDocumentParty 40436A |
| | PayerParty 40438A | 0..1 40440A | GDT:BusinessTransactionDocumentParty 40442A |
| | PayeeParty 40444A | 0..1 40446A | GDT:BusinessTransactionDocumentParty 40448A |
| Location 40486 | ShipToLocation 40450A | 0..1 40452A | GDT:BusinessTransactionDocumentLocation 40454A |
| | ShipFromLocation 40456A | 0..1 40458A | GDT:BusinessTransactionDocumentLocation 40460A |
| Delivery Information 40488 | DeliveryTerms 40462A | 0..1 40464A | GDT:DeliveryTerms 40466A |
| Payment Information 40490 | CashDiscountTerms 40468A | 0..1 40470A | GDT:CashDiscountTerms 40472A |
| | PaymentForm 40474A | 0..1 40476A | GDT:PaymentForm 40478A |
| Price Information 40492 | Price 40480A | 0..1 40482A | |

FIG. 404D

| | | | | |
|---|---|---|---|---|
| InvoiceDueMessage 40416 | | | | |
| InvoiceDue 40422 | | | | |
| Price Information 40492 | | GrossAmount 40484A | 0..1 40486A | GDT:Amount 40488A |
| | | NetAmount 40490A | 0..1 40492A | GDT:Amount 40494A |
| | | TaxAmount 40496A | 0..1 40498A | GDT:Amount 40400B |
| | | ExchangeRate 40402B | 0..1 40404B | GDT:ExchangeDate 40406B |
| | | PricingDate 40408B | 0..1 40410B | GDT:DateTime 40412B |
| Account Assignment 40494 | AccountAssignment 40414B | | 0..1 40416B | ???GDT:AccountingObjectSet Distribution ??? (zu Zeit nicht relevant) 40418B |
| Attachment 40496 | AttachmentWebAddress 40420B | | 0..n 40422B | GDT:AttachmentWebAddress 40424B |
| Description 40498 | Description 40426B | | 0..1 40428B | GDT:Description 40430B |
| Item 40400A | Item 40432B | | 1..n 40434B | GDT:InvoiceDueItem 40436B |

FIG. 404E

| | | | | |
|---|---|---|---|---|
| InvoiceDueMessage 40416 | | | | |
| InvoiceDue 40422 | | | | |
| Item 40400A | BaseBusinessTransaction DocumentItemID 40438B | 1 40440B | GDT:BusinessTransactionDocument ItemID 40442B |
| | BaseBusinessTransaction DocumentItemTypeCode 40444B | 1 40446B | GDT:BusinessTransactionDocument ItemTypeCode 40448B |
| | BaseBusinessTransaction DocumentItemDeletedIndicator 40450B | 1 40452B | GDT:DeletedIndicator 40454B |
| | SettlementRelevanceIndicator 40455B | 0..1 40456B | GDT:BusinessTransactionDocument SettlementRelevanceIndicator 40458B |
| | EvaluatedReceiptSettlement Indicator 40460B | 0..1 40462B | GDT:EvaluatedReceiptSettlementIndicator 40464B |
| | SettlementBlockedIndicator 40466B | 0..1 40468B | GDT:BusinessTransactionBlockedIndicator 40470B |
| | PricingIndicator 40472B | 0..1 40474B | GDT:BusinessTransactionDocument PricingIndicator 40476B |
| | PlannedBillingDate 40478B | 0..1 40480B | GDT:Date 40482B |

FIG. 404F

| | | | | |
|---|---|---|---|---|
| InvoiceDueMessage 40416 | | | | |
| InvoiceDue 40422 | | | | |
| Item 40400A | ProposedInvoice Date 40484B | | 0..1 40486B | GDT:DateTime 40488B |
| | Hierarchy Relationship 40490B | | 0..1 40492B | |
| | | ParentItemID 40494B | 1 40496B | GDT:BusinessTransactionDocumentItemID 40498B |
| | | TypeCode 40400C | 1 40402C | GDT:BusinessTransactionDocument ItemHierarchyRelationshipTypeCode 40403C |
| Product Information 40404C | Product 40424C | | 0..1 40426C | GDT:BusinessTransactionDocument Product 40428C |
| | ProductCategory 40430C | | 0..1 40432C | GDT:ProductCategory 40434C |
| | DeliveryDate TimePeriod 40436C | | 0..1 40438C | GDT:DateTimePeriod 40440C |
| | Quantity 40442C | | 1 40444C | GDT:Quantity 40446C |

FIG. 404G

| | | | | | |
|---|---|---|---|---|---|
| InvoiceDueMessage 40416 | | | | | |
| InvoiceDue 40422 | | | | | |
| Item 40400A | | | | | |
| Price Information 40406C | Price 40448C | | 0..1 40450C | | |
| | | GrossAmount 40452C | 0..1 40454C | GDT:Amount 40456C | |
| | | NetAmount 40458C | 0..1 40460C | GDT:Amount 40462C | |
| | | TaxAmount 40464C | 0..1 40466C | GDT:Amount 40468C | |
| | | ExchangeRate 40470C | 0..1 40472C | GDT:ExchangeRate 40474C | |
| | | PricingDate 40476C | 0..1 40478C | GDT:DateTime 40480C | |
| | | NetUnitPrice 40482C | 0..1 40484C | GDT:Price 40486C | |
| | ProcurementCost UpperLimit 40488C | | 0..1 40490C | GDT:ProcurementCostUpperLimit 40492C | |
| Party 40408C | BuyerParty 40494C | | 0..1 40496C | GDT:BusinessTransaction DocumentParty 40498C | |

FIG. 404H

| | | | | |
|---|---|---|---|---|
| InvoiceDueMessage 40416 | | | | |
| InvoiceDue 40422 | | | | |
| Item 40400A | | | | |
| Party 40408C | SellerParty 40400D | 0..1 40402D | GDT:BusinessTransactionDocumentParty 40404D |
| | ProductRecipientParty 40406D | 0..1 40408D | GDT:BusinessTransactionDocumentParty 40410D |
| | VendorParty 40412D | 0..1 40414D | GDT:BusinessTransactionDocumentParty 40416D |
| | BillToParty 40418D | 0..1 40420D | GDT:BusinessTransactionDocumentParty 40422D |
| | BillFromParty 40424D | 0..1 40426D | GDT:BusinessTransactionDocumentParty 40428D |
| | PayerParty 40430D | 0..1 40432D | GDT:BusinessTransactionDocumentParty 40434D |
| | PayeeParty 40436D | 0..1 40438D | GDT:BusinessTransactionDocumentParty 40440D |
| Location 40410C | ShipToLocation 40442D | 0..1 40444D | GDT:BusinessTransactionDocumentLocation 40446D |
| | ShipFromLocation 40448D | 0..1 40450D | GDT:BusinessTransactionDocumentLocation 40452D |

FIG. 404I

| | | | |
|---|---|---|---|
| InvoiceDueMessage 40416 | | | |
| InvoiceDue 40422 | | | |
| Item 40400A | | | |
| Delivery Information 40412C | DeliveryTerms 40454D | 0..1 40456D | GDT:DeliveryTerms 40458D |
| Payment Information 40414C | CashDiscountTerms 40460D | 0..1 40462D | GDT:CashDiscountTerms 40464D |
| | PaymentForm 40466D | 0..1 40468D | GDT:PaymentFormCode 40470D |
| Business Transaction Document Reference 40416C | PurchaseOrder Reference 40472D | 0..1 40474D | GDT:BusinessTransactionDocumentReference 40476D |
| | SalesOrderReference 40478D | 0..1 40480D | GDT:BusinessTransactionDocumentReference 40482D |
| | DeliveryReference 40484D | 0..1 40486D | GDT:BusinessTransactionDocumentReference 40488D |
| | PurchaseContract Reference 40490D | 0..1 40492D | GDT:BusinessTransactionDocumentReference 40494D |
| | SalesContract Reference 40496D | 0..1 40498D | GDT:BusinessTransactionDocumentReference 40400E |

FIG. 404J

| | | | |
|---|---|---|---|
| InvoiceDueMessage 40416 | | | |
| InvoiceDue 40422 | | | |
| Item 40400A | | | |
| Business Transaction Document Reference 40416C | BuyerProduct CatalogueReference 40402E | 0..1 40404E | GDT:CatalogueReference 40406E |
| | SellerProduct CatalogueReference 40408E | 0..1 40410E | GDT:CatalogueReference 40412E |
| Account Assignment 40418C | AccountAssignment 40414E | 0..1 40416E | *??? GDT:AccountingObjectSetDistribution ???* (zu Zeit nicht relevant) 40418E |
| Attachment 40420C | AttachmentWeb Address 40420E | 0..n 40422E | GDT:AttachmentWebAddress 40424E |
| Description 40422C | Description 40426E | 0..1 40428E | GDT:Description 40430E |

Fig. 407A

| Package 40700 | L 1 40702 | L2 40704 | L3 40706 | L4 40708 | L5 40710 | L6 40712 | Occ. 40714 | Datatype 40716 |
|---|---|---|---|---|---|---|---|---|
| Inventory Change Message 40718 | Inventory Change Message 40720 | | | | | | | MDT:InventoryChange Message 40722 |
| Inventory Change 40724 | | Inventory Change 40726 | | | | | 1 40728 | GDT:InventoryChange 40730 |
| | | | ID 40732 | | | | 1 40734 | GDT:BusinessTransaction DocumentID 40736 |
| | | | Business Transac-tionType Code 40738 | | | | 1 40740 | GDT:BusinessTransaction TypeCode 40742 |
| Item 40744 | | | Item 40746 | | | | 1..n 40748 | GDT:InventoryChange Item 40750 |
| | | | | ID 40752 | | | 1 40754 | GDT:BusinessTransaction DocumentItemID 40756 |
| | | | | Date Time 40758 | | | 1 40760 | GDT:DateTime 40762 |

Fig. 407B

| | | | | | |
|---|---|---|---|---|---|
| InventoryChangeMessage 40718 | | | | | |
| InventoryChange 40724 | | | | | |
| Item 40744 | Note 40764 | | | 0..1 40766 | GDT:Note 40768 |
| Outbound 40770 | Outbound 40776 | | | 0..1 40778 | GDT:InventoryChangeItem Outbound 40780 |
| | | Location 40782 | | 1..n 40784 | GDT:BTDLocation 40786 |
| | | | InternalID 40788 | 1 40790 | GDT:LocationInternalID 40792 |
| | | Product 40794 | | 1 40796 | GDT:BTDProduct 40798 |
| | | | InternalID 40700A | 1 40702A | GDT:ProductInternalID 40704A |
| | | OwnerParty 40706A | | 1 40708A | GDT:BTDParty 40710A |
| | | | InternalID 40712A | 1 40714A | GDT:PartyInternalID 40716A |
| | | Inventory Usability StatusCode 40718A | | 1 40720A | GDT:InventoryUsability StatusCode 40722A |

Fig. 407C

| | | | | |
|---|---|---|---|---|
| InventoryChangeMessage 40718 | | | | |
| InventoryChange 40724 | | | | |
| Item 40744 | | | | |
| Outbound 40770 | OrderingQuantity 40724A | | 0..1 40726A | GDT:Quantity 40728A |
| | ValuationQuantity 40730A | | 0..1 40732A | GDT:Quantity 40734A |
| | AdditionalQuantity 40736A | | 0..n 40738A | GDT:Quantity 40740A |
| Inbound 40774 | Inbound 40742A | | 0..1 40744A | GDT:InventoryChange ItemInbound 40746A |
| | Location 40748A | | 1..n 40750A | GDT:BTDLocation 40752A |
| | | InternalID 40754A | 1 40756A | GDT:LocationInternalID 40758A |
| | Product 40760A | | 1 40762A | GDT:BTDProduct 40764A |
| | | InternalID 40766A | 1 40768A | GDT:ProductInternalID 40770A |
| | OwnerParty 40772A | | 1 40774A | GDT:BTDParty 40776A |

Fig. 407D

| | | | | | | | | |
|---|---|---|---|---|---|---|---|---|
| InventoryChangeMessage 40718 | | | | | | | | |
| InventoryChange 40724 | | | | | | | | |
| Item 40744 | | | | | | | | |
| Inbound 40774 | | | | | InternalID 40778A | 1 40780A | GDT:PartyInternalID 40782A |
| | | | | InventoryUsability StatusCode 40784A | | 1 40786A | GDT:InventoryUsability StatusCode 40788A |
| | | | | OrderingQuantity 40790A | | 0..1 40792A | GDT:Quantity 40794A |
| | | | | Valuation Quantity 40796A | | 0..1 40798A | GDT:Quantity 40700B |
| | | | | Additional Quantity 40702B | | 0..n 40704B | GDT:Quantity 40706B |
| Business Transaction Document Reference 40776 | | | SalesOrder Reference 40708B | | | 0..1 40710B | GDT:BusinessTransac-tionDocumentReference 40712B |
| | | | Purchase Order Reference 40714B | | | 0..1 40716B | GDT:BusinessTransac-tionDocumentReference 40718B |

FIG. 410A

| Package 41000 | L1 41002 | L2 41004 | L3 41006 | L4 41008 | L5 41010 | Ocur. 41012 | SAP Global Data Type 41014 |
|---|---|---|---|---|---|---|---|
| SalesOrder Fulfillment Message 41016 | SalesOrder Fulfillment Message 41018 | | | | | 1 41020 | MDT:SalesOrderFulfillment Message 41022 |
| Message Header 41024 | | Message Header 41028 | | | | 0..1 41030 | GDT: BusinessDocument MessageHeader 41032 |
| SalesOrder Fulfillment 41026 | | SalesOrder Fulfillment 41034 | | | | 1 41036 | GDT: SalesOrderFulfillment 41038 |
| | | | ID 41040 | | | 1 41042 | GDT: BusinessTransaction DocumentID 41044 |
| | | | BaseBusiness Transaction DocumentID 41046 | | | 0..1 41048 | GDT: BusinessTransaction DocumentID 41050 |
| | | | BaseBusiness Transaction DocumentType Code 41052 | | | 0..1 41054 | GDT: BusinessTransaction DocumentTypeCode 41056 |

FIG. 410B

| SalesOrderFulfillmentMessage 41016 | | | | | |
|---|---|---|---|---|---|
| SalesOrder Fulfillment 41026 | ActionCode 41058 | | 0..1 41060 | GDT: ActionCode 41062 |
| | ItemListComplete TransmissionIndicator 41064 | | 0..1 41066 | GDT: CompleteTransmission Indicator 41068 |
| | CreationDateTime 41070 | | 0..1 41072 | GDT: DateTime 41074 |
| | LastChangeDateTime 41076 | | 0..1 41078 | GDT: DateTime 41080 |
| | AcceptanceStatusCode 41082 | | 0..1 41084 | GDT: AcceptanceStatusCode 41086 |
| Party 41088 | BuyerParty 41002A | | 1 41004A | GDT: BusinessTransaction DocumentParty 41006A |
| | | InternalID 41008A | 1 41010A | GDT: PartyInternalID 41012A |
| | | StandardID 41014A | 0..n 41016A | CDT:PartyStandardID 41018A |
| | SellerParty 41020A | | 1 41022A | GDT: BusinessTransaction DocumentParty 41024A |

Fig. 410C

SalesOrderFulfillmentMessage 41016

SalesOrderFulfillment 41026

| | | | | |
|---|---|---|---|---|
| Party 41088 | ProductRecipientParty 41026A | | 0..1 41028A | GDT: BusinessTransaction DocumentParty 41030A |
| | VendorParty 41032A | | 0..1 41034A | GDT: BusinessTransaction DocumentParty 41036A |
| | ManufacturerParty 41038A | | 0..1 41040A | GDT: BusinessTransaction DocumentParty 41042A |
| | CarrierParty 41044A | | 0..1 41046A | GDT: BusinessTransaction DocumentParty 41048A |
| Location 41090 | ShipToLocation 41050A | | 0..1 41052A | GDT: BusinessTransaction Document Location 41054A |
| | | InternalID 41056A | 1 41058A | GDT: LocationID 41060A |
| | ShipFromLocation 41062A | | 0..1 41064A | GDT: BusinessTransaction Document Location 41066A |

FIG. 410D

| | | | | |
|---|---|---|---|---|
| SalesOrderFulfillmentMessage 41016 | | | | |
| SalesOrderFulfillment 41026 | | | | |
| Delivery Information 41092 | DeliveryTerms 41068A | | 0..1 41070A | GDT: DeliveryTerms 41072A |
| | | DeliveryItemGroupID 41074A | 0..1 41076A | GDT: BusinessTransaction DocumentItemGroupID 41078A |
| | | Delivery PriorityCode 41080A | 0..1 41082A | GDT: BusinessTransaction PriorityCode 41084A |
| | | IncoTerms 41086A | 0..1 41088A | GDT: IncoTerms 41090A |
| | | PartialDelivery 41092A | 0..1 41094A | GDT: PartialDelivery 41096A |
| | | QuantityTolerance 41098A | 0..1 41000B | GDT: QuantityTolerance 41002B |
| | | Transport 41004B | 0..1 41006B | |
| | | Description 41008B | 0..1 41010B | GDT: Description 41012B |

FIG. 410E

| | | | | |
|---|---|---|---|---|
| SalesOrderFulfillmentMessage 41016 | | | | |
| SalesOrderFulfillment 41026 | | | | |
| Delivery Information 41092 | DeliveryControl 41014B | | 0..1 41016B | |
| | | DeliveryBlockedIndicator 41018B | 0..1 41020B | GDT: BusinessTransaction BlockedIndicator 41022B |
| Attachment 41094 | AttachmentWebAddress 41024B | | 0..n 41026B | GDT: WebAddress 41028B |
| Description 41096 | Description 41030B | | 0..1 41032B | GDT: Description 41034B |
| | ConfirmationDescription 41036B | | 0..1 41038B | GDT: Description 41040B |
| FollowUp 41098 | FollowUpSalesOrder FulfillmentConfirmation 41042B | | 0..1 41044B | |
| | | RequirementCode 41046B | 1 41048B | GDT: FollowUpMessage RequirementCode 41050B |
| | FollowUpDespatched DeliveryNotification 41052B | | 0..1 41054B | |

FIG. 410 F

| | | | | |
|---|---|---|---|---|
| SalesOrderFulfillmentMessage 41016 | | | | |
| SalesOrderFulfillment 41026 | | | | |
| FollowUp 41098 | | RequirementCode 41056B | 1 41058B | GDT: FollowUpMessage RequirementCode 41060B |
| | FollowUpBillingDue Notification 41062B | | 0..1 41064B | |
| | | RequirementCode 41066B | 1 41068B | GDT: FollowUpMessage RequirementCode 41070B |
| SalesOrder FulfillmentItem 41000A | Item 41072B | | 0..n 41074B | GDT: SalesOrderFulfillmentItem 41076B |
| | | ID 41078B | 1 41080B | GDT: BusinessTransaction DocumentID 41082B |
| | | TypeCode 41084B | 1 41086B | GDT: BusinessTransaction DocumentItemTypeCode 41088B |
| | | ActionCode 41090B | 0..1 41092B | GDT: ActionCode 41094B |

FIG. 410G

| | | | |
|---|---|---|---|
| SalesOrderFulfillmentMessage 41016 | | | |
| SalesOrderFulfillment 41026 | | | |
| SalesOrder FulfillmentItem 41000A | | | |
| ScheduleLineListComplete TransmissionIndicator 41096B | | 0..1 41098B | GDT: CompleteTransmission Indicator 41000C |
| CreationDateTime 41002C | | 0..1 41004C | GDT: DateTime 41006C |
| LastChangeDateTime 41008C | | 0..1 41010C | GDT: DateTime 41012C |
| AcceptanceStatusCode 41014C | | 0..1 41016C | GDT: AcceptanceStatusCode 41018C |
| HierarchyRelationship 41020C | | 0..1 41022C | |
| | ParentItemID 41024C | 0..1 41026C | GDT: BusinessTransaction DocumentItemID 41028C |
| | TypeCode 41030C | 1 41032C | GDT: BusinessTransaction DocumentItemHierarchy RelationshipTypeCode 41034C |

FIG. 410H

SalesOrderFulfillmentMessage 41016

SalesOrderFulfillment 41026

SalesOrderFulfillmentItem 41000A

| | | | | |
|---|---|---|---|---|
| Product Information 41036C | Product 41054C | | 1 41056C | GDT: BusinessTransactionDocumentProduct 41058C |
| | | ID 41060C | 0..1 41062C | GDT: ProductID 41064C |
| | | StandardID 41066C | 0..1 41068C | CDT:ProductStandardID 41070C |
| | | PartyID 41072C | 0..1 41074C | CDT:ProductPartyID 41076C |
| | | Description 41078C | 0..1 41080C | GDT: Description 41082C |
| | ProductCategory 41084C | | 0..1 41086C | GDT: BusinessTransactionDocumentProduct Category 41088C |
| | | ID 41090C | 0..1 41092C | GDT: ProductCategoryID 41094C |
| Batch 41038C | Batch 41096C | | 0..1 41098C | |
| | | ID 41000D | 0..1 41002D | GDT: BatchID 41004D |

FIG. 410I

| | | | |
|---|---|---|---|
| SalesOrderFulfillmentMessage 41016 | | | |
| SalesOrderFulfillment 41026 | | | |
| SalesOrderFulfillmentItem 41000A | | | |
| Party 41040C | BuyerParty 41006D | 1 41008D | GDT: BusinessTransactionDocumentParty 41010D |
| | SellerParty 41012D | 1 41014D | GDT: BusinessTransactionDocumentParty 41016D |
| | ProductRecipientParty 41018D | 0..1 41020D | GDT: BusinessTransactionDocumentParty 41022D |
| | VendorParty 41024D | 0..1 41026D | GDT: BusinessTransactionDocumentParty 41028D |
| | ManufacturerParty 41030D | 0..1 41032D | GDT: BusinessTransactionDocumentParty 41034D |
| | CarrierParty 41036D | 0..1 41038D | GDT: BusinessTransactionDocumentParty 41040D |
| Location 41042C | ShipToLocation 41042D | 0..1 41044D | GDT: BusinessTransactionDocument Location 41046D |
| | Ship From Location 41048D | 0..1 41050D | GDT: BusinessTransactionDocument Location 41052D |

FIG. 410J

| | | | | |
|---|---|---|---|---|
| SalesOrderFulfillmentMessage 41016 | | | | |
| SalesOrderFulfillment 41026 | | | | |
| SalesOrderFulfillmentItem 41000A | | | | |
| Delivery Information 41044C | Delivery Terms 41054D | | 0..1 41056D | GDT: DeliveryTerms 41058D |
| | | DeliveryItemGroupID 41060D | 0..1 41062D | GDT: BusinessTransaction DocumentItemGroupID 41064D |
| | | DeliveryPriorityCode 41066D | 0..1 41068D | GDT: BusinessTransaction riorityCode 41070D |
| | | Incoterms 41072D | 0..1 41074D | GDT: Incoterms 41076D |
| | | PartialDelivery 41078D | 0..1 41080D | GDT: PartialDelivery 41082D |
| | | QuantityTolerance 41084D | 0..1 41086D | GDT: QuantityTolerance 41088D |
| | | Transport 41090D | 0..1 41092D | |
| | | Description 41094D | 0..1 41096D | GDT: Description 41098D |

FIG. 410K

SalesOrderFulfillmentMessage 41016

SalesOrderFulfillment 41026

SalesOrderFulfillmentItem 41000A

| | | | | |
|---|---|---|---|---|
| Delivery Information 41044C | DeliveryControl 41000E | | 0..1 41002E | |
| | | DeliveryBlocked Indicator 41004E | 0..1 41006E | GDT: BusinessTransactionBlocked Indicator 41008E |
| Reference 41046C | QuoteReference 41010E | | 0..1 41012E | GDT: BusinessTransactionDocument Reference 41014E |
| | SalesContract Reference 41016E | | 0..1 41018E | GDT: BusinessTransactionDocument Reference 41020E |
| | PurchaseOrder Reference 41022E | | 0..1 41024E | GDT: BusinessTransactionDocument Reference 41026E |
| | OriginPurchase OrderReference 41034E | | 0..1 41036E | GDT: BusinessTransactionDocument Reference 41038E |

FIG. 410L

| | | | | |
|---|---|---|---|---|
| SalesOrderFulfillmentMessage 41016 | | | | |
| SalesOrderFulfillment 41026 | | | | |
| SalesOrderFulfillmentItem 41000A | | | | |
| Attachment 41048C | AttachmentWebAddress 41040E | | 0..n 41042E | GDT: WebAddress 41044E |
| Description 41050C | Description 41046E | | 0..1 41048E | GDT: Description 41050E |
| | ConfirmationDescription 41052E | | 0..1 41054E | GDT: Description 41056E |
| ScheduleLine 41052C | ScheduleLine 41058E | | 1..n 41060E | GDT: SalesOrderFulfillmentItem ScheduleLine 41062E |
| | | ID 41064E | 0..1 41066E | GDT: ScheduleLineID 41068E |
| | | ActionCode 41070E | 0..1 41072E | GDT: ActionCode 41074E |
| | | Quantity 41076E | 1 41078E | GDT: Quantity 41080E |
| | | DeliveryPeriod 41082E | 0..1 41084E | GDT: DateTimePeriod 41086E |
| | ConfirmedScheduled Line 41088E | | 0..n 41090E | GDT: SalesOrderFulfillmentItem ScheduleLine 41092E |

FIG. 410M

| | | | |
|---|---|---|---|
| SalesOrderFulfillmentMessage 41016 | | | |
| SalesOrderFulfillment 41026 | | | |
| SalesOrderFulfillmentItem 41000A | | | |
| ScheduleLine 41052C | ID 41094E | 0..1 41096E | GDT: ScheduleLineID 41098E |
| | ActionCode 41000F | 0..1 41002F | GDT: ActionCode 41004F |
| | Quantity 41006F | 1 41008F | GDT: Quantity 41010F |
| | DeliveryPeriod 41012F | 0..1 41014F | GDT: DateTimePeriod 41016F |

FIG. 414A

| Package 41400 | L1 41402 | L2 41404 | L3 41406 | L4 41408 | L5 41410 | Occ. 41412 | Generic Data Type 41414 |
|---|---|---|---|---|---|---|---|
| Despatched Delivery Notification Message 41416 | DespatchedDelivery Notification Message 41418 | | | | | 0..1 41420 | DespatchedDelivery NotificationMessage 41422 |
| Message Header 41424 | | Message Header 41428 | | | | 0..1 41430 | MessageHeader 41432 |
| | | | MessageID 41434 | | | 0..1 41436 | MessageID 41438 |
| | | | CreationDate Time 41440 | | | 0..1 41442 | DateTime 41444 |
| | | | SenderParty 41446 | | | 0..1 41448 | BusinessDocumentMessage HeaderParty 41450 |
| | | | RecipientParty 41452 | | | 0..1 41454 | BusinessDocumentMessage HeaderParty 41456 |
| Delivery 41426 | | Delivery 41458 | | | | 1 41460 | Delivery 41462 |

FIG. 414B

Despatched Delivery Notification Message 41416

| | | | | | | | |
|---|---|---|---|---|---|---|---|
| Delivery 41426 | | | ID 41464 | | | 1 41466 | BusinessTransactionDocumentID 41468 |
| | | | CreationDateTime 41470 | | | 1 41472 | DateTime 41474 |
| | | | GrossWeightMeasure 41476 | | | 0..1 41478 | Measure 41480 |
| | | | NetWeightMeasure 41482 | | | 0..1 41484 | Measure 41486 |
| | | | VolumeMeasure 41488 | | | 0..1 41490 | Measure 41492 |
| | | | ArrivalDateTime 41494 | | | 0..1 41496 | DateTime 41498 |
| | | | IssueDateTime 41400A | | | 0..1 41402A | DateTime 41404A |
| | | | CarrierHandoverDateTime 41406A | | | 0..1 41408A | DateTime 41410A |
| | | | GroupID 41412A | | | 0..1 41414A | BusinessTransactionDocumentGroupID 41416A |
| | | | WayBillID 41418A | | | 0..1 41420A | BusinessTransactionDocumentID 41422A |

FIG. 414C

| Despatched Delivery Notification Message 41416 | | | |
|---|---|---|---|
| Delivery 41426 | TransportModeCode 41424A | 0..1 41426A | TransportModeCode 41428A |
| | DangerousGoodsIndicator 41430A | 0..1 41432A | DangerousGoodsIndicator 41434A |
| | Note 41436A | 0..1 41438A | Note 41440A |
| Party 41442A | VendorParty 41452A | 1 41454A | BusinessTransactionDocumentParty 41456A |
| | ProductRecipientParty 41458A | 1 41460A | BusinessTransactionDocumentParty 41462A |
| | CarrierParty 41464A | 0..1 41466A | BusinessTransactionDocumentParty 41468A |
| Location 41444A | ShipFromLocation 41470A | 0..1 41472A | BusinessTransactionDocumentShipFromLocation 41474A |
| | ShipToLocation 41476A | 1 41478A | BusinessTransactionDocumentShipToLocation 41480A |
| Transport Information 41446A | TransportMeans 41482A | 0..1 41484A | TransportMeans 41486A |
| | TransportTracking 41488A | 0..1 41490A | TransportTracking 41492A |

FIG. 414D

Despatched Delivery Notification Message 41416

Delivery 41426

| | | | | |
|---|---|---|---|---|
| Delivery Information 41448A | Incoterms 41494A | | 0..1 41496A | Incoterms 41498A |
| Delivery Item 41450A | Item 41400B | | 1..n 41402B | DeliveryItem 41404B |
| | | ID 41406B | 0..1 41408B | BusinessTransactionDocumentItemID 41410B |
| | | ConsignmentIndicator 41412B | 0..1 41414B | ConsignmentIndicator 41416B |
| | | GrossWeight-Measure 41418B | 0..1 41420B | Measure 41422B |
| | | NetWeight-Measure 41424B | 0..1 41426B | Measure 41428B |
| | | Volume-Measure 41430B | 1 41432B | Measure 41434B |
| | | Quantity 41436B | 0..1 41438B | Quantity 41440B |
| | | DangerousGoods 41442B | 0..1 41444B | DangerousGoods 41446B |
| | | Note 41448B | 0..1 41450B | Note 41452B |

FIG. 414E

| | | | | |
|---|---|---|---|---|
| Despatched Delivery Notification Message 41416 | | | | |
| Delivery 41426 | | | | |
| Delivery Item 41450A | | | | |
| Business Transaction Document Reference 41454B | Purchase Order Reference 41458B | | 0..1 41460B | BusinessTransactionDcumentReference 41462B |
| | Scheduling Agreement Reference 41464B | | 0..1 41466B | BusinessTransactionDcumentReference 41468B |
| | SalesOrder Reference 41470B | | 1 41472B | BusinessTransactionDocumentProduct 41474B |
| Product Information 41456B | Product 41476B | | 0..1 41478B | BusinessTransactionDocumentProduct 41480B |
| | | InternalID 41482B | 0..1 41484B | ProductInternalID 41486B |
| | | StandardID 41488B | 0..1 41490B | ProductStandardID 41492B |
| | | ShipperID 41494B | 0..1 41496B | ProductPartyID 41498B |
| | | ConsigneeID 41400C | 0..1 41402C | ProductPartyID 41404C |

FIG. 414F

| | | | | | |
|---|---|---|---|---|---|
| Despatched Delivery Notification Message 41416 | | | | | |
| Delivery 41426 | | | | | |
| Delivery Item 41450A | | | | | |
| Product Information 41456B | | ChangeID 41406C | 0..1 41408C | ProductChangeID 41410C |
| | | Note 41412C | 0..1 41414C | Note 41416C |
| | Batch 41418C | | 0..1 41420C | |
| | | InternalID 41422C | 0..1 41424C | BatchID 41426C |
| | | ShipperID 41428C | 0..1 41430C | BatchID 41432C |
| | | ConsigneeID 41434C | 0..1 41436C | BatchID 41438C |
| | | ManufacturingDate 41440C | 0..1 41442C | Date 41444C |
| | | BestBeforeDate 41446C | 0..1 41448C | Date 41450C |
| | | OriginCountryCode 41452C | 0..1 41454C | CountryCode 41456C |

FIG. 415A

| Package 41500 | L1 41502 | L2 41504 | L3 41506 | L4 41508 | L5 41510 | O. 41512 | GDT 41514 |
|---|---|---|---|---|---|---|---|
| Received Delivery Notification Message 41516 | ReceivedDelivery Notification Message 41518 | | | | | | ReceivedDelivery NotificationMessage 41520 |
| Delivery 41522 | | Delivery 41524 | | | | 1 41526 | Delivery 41528 |
| | | | ID 41530 | | | 1 41532 | BusinessTransaction DocumentID 41534 |
| | | | Receipt DateTime 41536 | | | 0..1 41538 | DateTime 41540 |
| Party 41542 | | | Vendor Party 41548 | | | 1 41550 | BusinessTransaction DocumentParty 41552 |
| | | | Product Recipient Party 41554 | | | 1 41556 | BusinessTransaction DocumentParty 41558 |
| Location 41544 | | | ShipTo Location 41560 | | | 0..1 41562 | BusinessTransaction DocumentShipTo Location 41564 |

FIG. 415B

| | | | | | |
|---|---|---|---|---|---|
| Received Delivery Notification Message 41516 | | | | | |
| Delivery 41522 | | | | | |
| Delivery Item 41546 | Item 41566 | | | 0..n 41568 | |
| | | ID 41570 | | 0..1 41572 | BusinessTransactionDocumentItemID 41574 |
| | | CompletedIndicator 41576 | | 0..1 41578 | BusinessTransactionCompleteIndicator 41580 |
| | | InventoryStatusDateTime 41582 | | 0..1 41584 | DateTime 41586 |
| | | ReceivedQuantity 41588 | | 1 41590 | Quantity 41592 |
| Product Information 41594 | | Product 41598 | | 1 41500A | BusinessTransactionDocumentProduct 41502A |
| | | | InternalID 41504A | 0..1 41506A | ProductInternalID 41508A |
| | | | StandardID 41510A | 0..1 41512A | ProductStandardID 41514A |
| | | | ShipperID 41516A | 0..1 41518A | ProductPartyID 41520A |

FIG. 415C

| | | | | |
|---|---|---|---|---|
| Received Delivery Notification Message 41516 | | | | |
| Delivery 41522 | | | | |
| Delivery Item 41546 | | | | |
| Product Information 41594 | | ConsigneeID 41522A | 0..1 41524A | ProductPartyID 41526A |
| Delivery Information 41596 | Variance 41528A | | 0..n 41530A | |
| | | Quantity 41532A | 1 41534A | Quantity 41536A |
| | | QuantityDiscrepancy Code 41538A | 1 41540A | QuantityDiscrepancyCode 41542A |

FIG. 418A

| Package 41800 | L1 41802 | L2 41804 | L3 41806 | L4 41808 | L5 41810 | L6 41812 | Occ. 41814 | Type 41816 | Name 41818 |
|---|---|---|---|---|---|---|---|---|---|
| Invoice Accounting Message 41820 | Invoice Accounting Message 41822 | | | | | | | MDT 41824 | Invoice Accounting Message 41825 |
| Invoice Accounting 41826 | | Invoice Accounting 41828 | | | | | 1 41830 | AGDT 41832 | Invoice Accounting 41834 |
| | | | ID 41836 | | | | 1 41838 | BGDT 41840 | Business Transaction DocumentID 41842 |
| | | | Type Code 41844 | | | | 1 41846 | BGDT 41848 | Business Transaction Document TypeCode 41850 |
| | | | Date 41852 | | | | 1 41854 | BGDT 41856 | Date 41858 |
| | | | Posting Date 41860 | | | | 0..1 41862 | BGDT 41864 | Date 41866 |

FIG. 418B

| | | | | | | |
|---|---|---|---|---|---|---|
| InvoiceAccountingMessage 41820 | | | | | | |
| InvoiceAccounting 41826 | | | | | | |
| Party 41868 | | DebtorParty 41874 | | 1 41876 | AGDT 41878 | BusinessTransaction DocumentParty 41880 |
| | | | InternalID 41882 | 1 41884 | BGDT 41886 | PartyID 41888 |
| | | Creditor Party 41890 | | 1 41892 | AGDT 41894 | BusinessTransaction DocumentParty 41896 |
| | | | InternalID 41898 | 1 41800A | BGDT 41802A | PartyID 41804A |
| BusinessTransaction DocumentReference 41870 | | Original Invoice Reference 41806A | | 0..1 41808A | AGDT 41810A | BusinessTransaction DocumentReference 41812A |
| | | | ID 41814A | 1 41816A | BGDT 41818A | BusinessTransaction DocumentID 41820A |
| | | Original Vendor Invoice Reference 41822A | | 0..1 41824A | AGDT 41826A | BusinessTransaction DocumentReference 41828A |

FIG. 418C

| | | | | | | | | |
|---|---|---|---|---|---|---|---|---|
| InvoiceAccountingMessage | | | 41820 | | | | | |
| InvoiceAccounting | | | 41826 | | | | | |
| BusinessTransaction DocumentReference 41870 | | | ID 41830A | | | 1 41832A | BGDT 41834A | BusinessTrans-actionDocumentID 41836A |
| Item 41872 | | Item 41838A | | | | | | |
| DueItem 41840A | | | DueItem 41846A | | | 1..n 41848A | AGDT 41850A | InvoiceAccounting DueItem 41852A |
| | | | | Amount 41854A | | 1 41856A | BGDT 41858A | Amount 41860A |
| TaxItem 41842A | | | TaxItem 41862A | | | 0..n 41864A | AGDT 41866A | InvoiceAccounting TaxItem 41868A |
| | | | | Amount 41870A | | 1 41872A | BGDT 41874A | Amount 41876A |
| | | | | ProductTax EventType Code 41878A | | 1 41880A | BGDT 41882A | ProductTaxEvent TypeCode 41884A |

FIG. 418D

| | | | | | | |
|---|---|---|---|---|---|---|
| InvoiceAccountingMessage 41820 | | | | | | |
| InvoiceAccounting 41826 | | | | | | |
| Item 41872 | | | | | | |
| ExpenseRevenue Item 41844A | Expense Revenue Item 41886A | | | 1..n 41888A | AGDT 41890A | InvoiceAccounting ExpenseRevenue Item 41892A |
| | | Amount 41894A | | 1 41896A | BGDT 41898A | Amount 41800B |
| | | PriceComponentType Code 41802B | | 1 41804B | BGDT 41806B | PriceComponent TypeCode 41808B |
| | | Quantity 41810B | | 0..1 41812B | BGDT 41814B | Quantity 41816B |
| Product Information 41818B | | Product 41824B | | 0..1 41826B | AGDT 41828B | BusinessTransactionDocument Product 41830B |
| | | | InternalID 41832B | 1 41834B | BGDT 41836B | ProductID 41838B |

FIG. 418E

| | | | | |
|---|---|---|---|---|
| InvoiceAccountingMessage 41820 | | | | |
| InvoiceAccounting 41826 | | | | |
| Item 41872 | | | | |
| ExpenseRevenueItem 41844A | | | | |
| Business Transaction Document Reference 41820B | PurchaseOrder Reference 41840B | 0..1 41842B | AGDT 41844B | BusinessTransaction DocumentReference 41846B |
| | SalesOrder Reference 41848B | 0..1 41850B | AGDT 41852B | BusinessTransaction DocumentReference 41854B |
| Accounting ObjectSet 41822B | AccountingObject Set 41856B | 0..1 41858B | AGDT 41860B | AccountingObjectSet 41862B |

Fig. 421A

| Package 42100 | L1 42102 | L2 04 | L3 42106 | L4 42108 | L5 42110 | Occ. 42112 | SAP Global Data Type 42114 |
|---|---|---|---|---|---|---|---|
| Delivery Execution Request Message 42116 | Delivery Execution Request Message 42118 | | | | | | DeliveryExecutionRequest Message 42120 |
| Message Header 42122 | | Message Header 42126 | | | | 0..1 42128 | MessageHeader 42130 |
| Delivery Execution Request 42124 | | Delivery Execution Request 42132 | | | | 1 42134 | DeliveryExecutionRequest 42136 |
| | | | BaseBusiness Transaction DocumentID 42138 | | | 1 42140 | BusinessTransaction DocumentID 42142 |
| | | | BaseBusiness Transaction Document TypeCode 42144 | | | 1 42146 | BusinessTransaction DocumentTypeCode 42148 |
| | | | ActionCode 42150 | | | 0..1 42152 | ActionCode 42154 |

Fig. 421B

DeliveryExecutionRequestMessage 42116

| | | | | | |
|---|---|---|---|---|---|
| Delivery Execution Request 42124 | CreationDateTime 42156 | | | 0..1 42158 | DateTime 42160 |
| | LastChangeDateTime 42162 | | | 0..1 42164 | DateTime 42166 |
| | ItemListComplete TransmissionIndicator 42168 | | | 0..1 42170 | CompleteTransmission Indicator 42172 |
| Party 42174 | BuyerParty 42188 | | | 0..1 42190 | BusinessTransaction DocumentParty 42192 |
| | | InternalID 42194 | | 1 42196 | PartyInternalID 42198 |
| | | Address 42100A | | 0..1 42102A | Address 42104A |
| | | Contact 42106A | | 0..1 42108A | BusinessTransaction DocumentContact 42110A |
| | | | InternalID 42112A | 1 42114A | PartyInternalID 42116A |
| | | | Address 42118A | 0..1 42120A | Address 42122A |

Fig. 421C

DeliveryExecutionRequestMessage 42116

DeliveryExecutionRequest 42124

| | | | | |
|---|---|---|---|---|
| Party 42174 | SellerParty 42124A | ... 42126A | 0..1 42128A | BusinessTransactionDocumentParty 42130A |
| | ProductRecipientParty 42132A | ... 42134A | 0..1 42136A | BusinessTransactionDocumentParty 42138A |
| | VendorParty 42140A | ... 42142A | 0..1 42144A | BusinessTransactionDocumentParty 42146A |
| | CarrierParty 42148A | ... 42150A | 0..1 42152A | BusinessTransactionDocumentParty 42154A |
| Location 42176 | ShipToLocation 42156A | | 0..1 42158A | BusinessTransactionDocumentLocation 42160A |
| | | InternalID 42162A | 1 42164A | LocationInternalID 42166A |
| | | Address 42168A | 0..1 42170A | Address 42172A |
| | ShipFromLocation 42174A | ... 42176A | 0..1 42178A | BusinessTransactionDocumentLocation 42180A |
| Delivery Information 42178 | DeliveryTerms 42182A | | 0..1 42184A | DeliveryTerms 42186A |
| | | DeliveryItem GroupID 42188A | 0..1 42190A | BusinessTransactionDocumentItem GroupID 42192A |

Fig. 421D

| | | | | |
|---|---|---|---|---|
| DeliveryExecutionRequestMessage 42116 | | | | |
| DeliveryExecutionRequest 42124 | | | | |
| Delivery Information 42178 | | DeliveryPriorityCode 42194A | 0..1 42196A | BusinessTransactionPriorityCode 42198A |
| | | IncoTerms 42100B | 0..1 42102B | Incoterms 42104B |
| | | PartialDelivery 42106B | 0..1 42108B | PartialDelivery 42110B |
| | | QuantityTolerance 42112B | 0..1 42114B | QuantityTolerance 42116B |
| | | Transport 42118B | 0..1 42120B | |
| | | Description 42122B | 0..1 42124B | Description 42126B |
| | DeliveryControl 42128B | | 0..1 42130B | |
| | | DeliveryBlockedIndicator 42132B | 0..1 42134B | BusinessTransactionBlocked Indicator 42136B |
| FollowUp Message 42180 | FollowUp Despatched Delivery Notification 42138B | | 0..1 42140B | |

Fig. 421E

| | | | |
|---|---|---|---|
| DeliveryExecutionRequest Message 42116 | | | |
| DeliveryExecutionRequest 42124 | | | |

| | | | | |
|---|---|---|---|---|
| FollowUp Message 42180 | | RequirementCode 42142B | 1 42144B | FollowUpMessage RequirementCode 42146B |
| | FollowUpBillingDue Notification 42148B | | 0..1 42150B | |
| | | RequirementCode 42152B | 1 42154B | FollowUpMessage Requirement Code 42156B |
| | FollowUpInvoicingDue Notification 42158B | | 0..1 42160B | |
| | | RequirementCode 42162B | 1 42164B | FollowUpMessage RequirementCode 42166B |
| Attachment 42182 | AttachmentWebAddress 42168B | | 0..n 42170B | WebAddress 42172B |
| Description 42184 | InternalDescription 42174B | | 0..1 42176B | Description 42178B |
| | Description 42180B | | 0..1 42182B | Description 42184B |

Fig. 421F

| | | | | | |
|---|---|---|---|---|---|
| DeliveryExecutionRequest Message 42116 | | | | | |
| DeliveryExecutionRequest 42124 | | | | | |
| Delivery Request Item 42186 | Item 42186B | | | 0..n 42188B | DeliveryExecutionRequest Item 42190B |
| | | BaseBusinessTransaction DocumentItemID 42192B | | 1 42194B | BusinessTransaction DocumentItemID 42196B |
| | | BaseBusinessTransaction DocumentItemTypeCode 42198B | | 1 42100C | BusinessTransaction DocumentItemTypeCode 42102C |
| | | ActionCode 42104C | | 0..1 42106C | ActionCode 42108C |
| | | CreationDateTime 42110C | | 0..1 42112C | DateTime 42114C |
| | | LastChangeDateTime 42116C | | 0..1 42118C | DateTime 42120C |
| | | HierarchyRelationship 42122C | | 0..1 42124C | |
| | | | Parent ItemId 42126C | 0..1 42128C | BusinessTransaction DocumentItemID 42130C |

Fig. 421G

| | | | | |
|---|---|---|---|---|
| DeliveryExecutionRequest Message 42116 | | | | |
| DeliveryExecutionRequest 42124 | | | | |
| Delivery Request Item 42186 | | TypeCode 42132C | 1 42134C | BusinessTransactionDocumentItemHierarchyRelationshipTypeCode 42136C |
| | ScheduleLineListCompleteTransmissionIndicator 42138C | | 0..1 42140C | CompleteTransmissionIndicator 42142C |
| Product Information 42144C | Product 42160C | | 1 42162C | BusinessTransactionDocumentProduct 42164C |
| | | InternalID 42166C | 0..1 42168C | ProductInternalID 42170C |
| | | Description 42172C | 0..1 42174C | Note 42176C |
| Batch 42146C | Batch 42178C | | 0..1 42180C | Batch 42182C |
| | | ID 42184C | 0..1 42186C | BatchID 42188C |
| Party 42148C | BuyerParty 42190C | ... 42192C | 0..1 42194C | BusinessTransactionDocumentParty 42196C |

Fig. 421H

DeliveryExecutionRequest Message 42116

DeliveryExecutionRequest 42124

DeliveryRequestItem 42186

| | | | | | |
|---|---|---|---|---|---|
| Party 42148C | SellerParty 42198C | ... 42100D | 0..1 42102D | BusinessTransactionDocumentParty 42104D |
| | ProductRecipientParty 42106D | ... 42108D | 0..1 42110D | BusinessTransactionDocumentParty 42112D |
| | VendorParty 42114D | ... 42116D | 0..1 42118D | BusinessTransactionDocumentParty 42120D |
| | CarrierParty 42122D | ... 42124D | 0..1 42126D | BusinessTransactionDocumentParty 42128D |
| Location 42150C | ShipToLocation 42130D | ... 42132D | 0..1 42134D | BusinessTransactionDocument Location 42136D |
| | ShipFromLocation 42138D | ... 42140D | 0..1 42142D | BusinessTransactionDocument Location 42144D |
| Delivery Information 42152C | DeliveryTerms 42146D | | 0..1 42148D | DeliveryTerms 42150D |
| | | DeliveryItem GroupID 42152D | 0..1 42154D | BusinessTransactionDocumentItem GroupID 42156D |

Fig. 421I

| | | | | |
|---|---|---|---|---|
| DeliveryExecutionRequest Message | 42116 | | | |
| DeliveryExecutionRequest | 42124 | | | |
| DeliveryRequestItem | 42186 | | | |
| Delivery Informa-tion 42152C | | DeliveryPriorityCode 42158D | 0..1 42160D | BusinessTransactionPriority Code 42162D |
| | | Incoterms 42164D | 0..1 42166D | Incoterms 42168D |
| | | PartialDeliery 42170D | 0..1 42172D | PartialDelivery 42174D |
| | | QuantityTolerance 42176D | 0..1 42178D | QuantityTolerance 42180D |
| | | Transport 42182D | 0..1 42184D | |
| | | Description 42186D | 0..1 42188D | Description 42190D |
| | DeliveryControl 42192D | | 0..1 42194D | |
| | | DeliveryBlocked 42196D | 0..1 42198D | BusinessTransactionBlocked Indicator 42100E |

Fig. 421J

DeliveryExecutionRequest Message 42116

DeliveryExecutionRequest 42124

DeliveryRequestItem 42186

| | | | | |
|---|---|---|---|---|
| Attachment 42154C | AttachmentWebAddress 42102E | | 0..n 42104E | WebAddress 42106E |
| Description 42156C | InternalDescription 42108E | | 0..1 42110E | Description 42112E |
| | Description 42114E | | 0..1 42116E | Description 42118E |
| ScheduleLine 42158C | ScheduleLine 42120E | | 1..n 42122E | DeliveryExecutionRequest ItemScheduleLine 42124E |
| | | ID 42126E | 0..1 42128E | ScheduleLineID 42130E |
| | | ActionCode 42132E | 0..1 42134E | ActionCode 42136E |
| | | Quantity 42138E | 1 42140E | Quantity 42142E |
| | | Delivery Period 42144E | 0..1 42146E | DateTimePeriod 42148E |
| | CofirmedScheduleLine 42150E | | 0..n 42152E | DeliveryExecutionRequest ItemScheduleLine 42154E |

Fig. 421K

| | | | | | |
|---|---|---|---|---|---|
| DeliveryExecutionRequest Message 42116 | | | | | |
| DeliveryExecutionRequest 42124 | | | | | |
| DeliveryRequestItem 42186 | | | | | |
| ScheduleLine 42158C | | ID 42156E | 0..1 42158E | ScheduleLineID 42160E | |
| | | ActionCode 42162E | 0..1 42164E | ActionCode 42166E | |
| | | Quantity 42168E | 1 42170E | Quantity 42172E | |
| | | Delivery Period 42174E | 0..1 42176E | DateTimePeriod 42178E | |

Fig. 424 A

| Package 42400 | L 1 42402 | L2 42404 | L3 42406 | L4 42408 | L5 42410 | L6 42412 | C. 42414 | G/CDT 42416 | Lgth. 42420 |
|---|---|---|---|---|---|---|---|---|---|
| Delivery Schedule Notification 42424 | Delivery Schedule Notifica-tion 42426 | | | | | | | Delivery Schedule Notification 42428 | |
| Business Docu-ment Message Header 42432 | | Message Header 42436 | | | | | 1 42438 | Business Document Message Header 42440 | |
| | | | ID 42446 | | | | 1 42448 | Business Document MessageID 42450 | 1.35 42452 |
| | | | Refer-ence ID 42456 | | | | 0..1 42458 | Business Document Message ID 42460 | 1.35 42462 |
| | | | Crea-tion Date Time 42466 | | | | 1 42468 | DateTime 42470 | |

Fig. 424B

| DeliveryScheduleNotification 42424 | | | | | | |
|---|---|---|---|---|---|---|
| Business Document Message Header 42432 | | Sender Party 42474 | | | 0..1 42476 | BusinessDocumentMessageHeader Party 42478 |
| | | | InternalID 42484 | | 0..1 42486 | PartyInternalID 42488 |
| | | | Standard ID 42492 | | 0..n 42494 | PartyStandardID 42496 |
| | | Recipient Party 42400A | | | 0..1 42402A | BusinessDocumentMessageHeader Party 42404A |
| | | | InternalID 42410A | | 0..1 42412A | PartyInternalID 42414A |
| | | | Standard ID 42418A | | 0..n 42420A | PartyStandardID 42422A |
| Delivery Schedule 42434 | Delivery Sched-ule 42426A | | | | 1 42428A | DeliverySchedule 42430A |

Fig. 424C

| DeliveryScheduleNotification 42424 | | | | | | |
|---|---|---|---|---|---|---|
| Delivery Schedule 42434 | ID 42434A | | | 0..1 42436A | Business Transaction DocumentID 42438A | 1.35 42440A |
| | TypeCode 42444A | | | 0..1 42446A | Delivery Schedule TypeCode 42448A | 1 42450A |
| | CreationDate Time 42454A | | | 1 42456A | DateTime 42458A | |
| Party 42462A | Buyer Party 42466A | | | 0..1 42468A | Business Transaction Document Party 42470A | |
| | | InternalID 42476A | | 0..1 42478A | PartyInternal ID 42480A | 1..10 42482A |
| | | Standard ID 42486A | | 0..n 42488A | Party StandardID 42490A | 1.. 13 / 9 42492A |

Fig. 424D

| | | | | | | |
|---|---|---|---|---|---|---|
| DeliveryScheduleNotification 42424 | | | | | | |
| DeliverySchedule 42434 | | | | | | |
| Party 42462A | | BuyerID 42496A | | 0..1 42498A | PartyParty ID 42400B | 1..10 42402B |
| | | VendorID 42406B | | 0..1 42408B | PartyParty ID 42410B | 1:.10 42412B |
| | | Address 42416B | | 0..1 42418B | Address 42420B | |
| | VendorParty 42426B | | | 1 42428B | Business Transaction Document Party 42430B | |
| | | InternalID 42436B | | 0..1 42438B | Party Internal ID 42440B | 1..10 42442B |
| | | Standard ID 42446B | | 0..n 42448B | Party StandardID 42450B | 1.. 13 / 9 42452B |
| | | BuyerID 42456B | | 0..1 42458B | PartyParty ID 42460B | 1..10 42462B |

Fig. 424E

DeliveryScheduleNotification 42424

DeliverySchedule 42434

| | | | | | |
|---|---|---|---|---|---|
| Party 42462A | | VendorID 42466B | 0..1 42468B | PartyParty ID 42470B | 1..10 42472B |
| | | Address 42476B | 0..1 42478B | Address 42480B | |
| | Note 42486B | | 0..1 42488B | Note 42490B | 1..132c 42492B |
| Item 42464A | Item 42496B | | 1..n 42498B | Delivery Schedule Item 42400C | |
| | | @action Code 42404C | 0..1 42406C | ActionCode 42408C | 2 42410C |
| | | ID 42414C | 1 42416C | Business TransactionDocument ItemID 42418C | 1..35 42420C |

Fig. 424F

| | | | | | | | | |
|---|---|---|---|---|---|---|---|---|
| DeliveryScheduleNotification 42424 | | | | | | | | |
| DeliverySchedule 42434 | | | | | | | | |
| Item 42464A | | | | | | | | |
| Business Transaction Document Reference 42424C | | | | Scheduling Agreement Reference 42436C | | 1 42438C | BusinessTrans-actionDocument Reference 42440C | |
| Release 42426C | | | | Release 42444C | | 1 42446C | | |
| | | | | | ID 42450C | 1 42452C | BusinessTrans-actionDocument ID 42454C | 1..35 42456C |
| | | | | | Creation DateTime 42460C | 0..1 42462C | DateTime 42464C | |
| | | | | | Horizon DateTime 42468C | 0..1 42470C | DateTime 42472C | |
| | | | | Previous Release 42476C | | 0..1 42478C | | |

Fig. 424G

| | | | | | |
|---|---|---|---|---|---|
| DeliveryScheduleNotification 42424 | | | | | |
| DeliverySchedule 42434 | | | | | |
| Item 42464A | | | | | |
| Release 42426C | | ID 42482C | 1 42484C | Business Transaction DocumentID 42486C | 1..35 42488C |
| | | Creation DateTime 42492C | 0..1 42494C | DateTime 42496C | |
| Location 42428C | ShipFrom Location 42400D | | 0..1 42402D | Business Transaction Document ShipFrom Location 42404D | |
| | | InternalID 42410D | 0..1 42412D | Location InternalID 42414D | 1..20 42416D |
| | | StandardID 42420D | 0..n 42422D | Location StandardID 42424D | 1..13 42426D |

Fig. 424H

| | | | | | |
|---|---|---|---|---|---|
| DeliveryScheduleNotification 42424 | | | | | |
| DeliverySchedule 42434 | | | | | |
| Item 42464A | | | | | |
| Location 42428C | BuyerID 42430D | | 0..1 42432D | LocationParty ID 42434D | 1..20 42436D |
| | VendorID 42440D | | 0..1 42442D | LocationParty ID 42444D | 1..20 42446D |
| | Loading Location 42450D | | 0..1 42452D | Business Transaction Document Location 42454D | |
| | | InternalID 42460D | 0..1 42462D | Location InternalID 42464D | 1..20 42466D |
| | | Standard ID 42470D | 0..1 42472D | Location StandardID 42474D | 1..13 42476D |
| | | BuyerID 42480D | 0..1 42482D | Location PartyID 42484D | 1..20 42486D |

Fig. 424I

| | | | | | | |
|---|---|---|---|---|---|---|
| DeliveryScheduleNotification 42424 | | | | | | |
| DeliverySchedule 42434 | | | | | | |
| Item 42464A | | | | | | |
| Location 42428C | | | Vendor ID 42490D | 0..1 42492D | Location PartyID 42494D | 1..20 42496D |
| | | Address 42400E | | 0..1 42402E | Address 42404E | |
| | Trans-shipment Location 42410E | | | 0..1 42412E | Business Transaction Document Transship-mentLoca-tion 42414E | |
| | | InternalID 42420E | | 0..1 42422E | Location InternalID 42424E | 1..20 42426E |
| | | Standard ID 42430E | | 0..n 42432E | Location StandardID 42434E | 1..13 42436E |

Fig. 424J

DeliveryScheduleNotification 42424

DeliverySchedule 42434

Item 42464A

| | | | | | |
|---|---|---|---|---|---|
| Location 42428C | | BuyerID 42440E | 0..1 42442E | Location PartyID 42444E | 1..20 42446E |
| | | VendorID 42450E | 0..1 42452E | Location PartyID 42454E | 1..20 42456E |
| | | Address 42460E | 0..1 42462E | Address 42464E | |
| | ShipTo Location 42470E | | 1 42472E | BusinessTrans-actionDocument ShipToLocation 42474E | |

Fig. 424K

| | | | | | |
|---|---|---|---|---|---|
| DeliveryScheduleNotification 42424 | | | | | |
| DeliverySchedule 42434 | | | | | |
| Item 42464A | | | | | |
| Location 42428C | InternalID 42480E | | 0..1 42482E | LocationInternal ID 42484E | 1..20 42486E |
| | Standard ID 42490E | | 0..n 42492E | Location StandardID 42494E | 1..13 42496E |
| | BuyerID 42400F | | 0..1 42402F | LocationPartyID 42404F | 1..20 42406F |
| | VendorID 42410F | | 0..1 42412F | LocationPartyID 42414F | 1..20 42416F |
| | Unloading Location 42420F | | 0..1 42422F | BusinessTrans-actionDocument Location 42424F | |
| | | Internal ID 42430F | 0..1 42432F | LocationInternal ID 42434F | 1..20 42436F |
| | | Stan-dardID 42440F | 0..n 42442F | Location StandardID 42444F | 1..13 42446F |

Fig. 424L

| | | | | | | |
|---|---|---|---|---|---|---|
| DeliveryScheduleNotification 42424 | | | | | | |
| DeliverySchedule 42434 | | | | | | |
| Item 42464A | | | | | | |
| Location 42428C | | | Buyer ID 42450F | 0..1 42452F | Location PartyID 42454F | 1..20 42456F |
| | | | Vendor ID 42460F | 0..1 42462F | Location PartyID 42464F | 1..20 42466F |
| | | Address 42470F | | 0..1 42472F | Addess 42474F | |
| Product Information 42430C | Product 42480F | | | 1 42482F | Business Transaction Document Product 42484F | |
| | | InternalID 42490F | | 0..1 42492F | Product InternalID 42494F | 1..40 42496F |
| | | Standard ID 42400G | | 0..1 42402G | Product StandardID 42404G | 14 42406G |

Fig. 424M

DeliveryScheduleNotification 42424

DeliverySchedule 42434

Item 42464A

| | | | | | |
|---|---|---|---|---|---|
| Product Information 42430C | | BuyerID 42410G | 0..1 42412G | Product PartyID 42414G | 1..40 42416G |
| | | VendorID 42420G | 0..1 42422G | ProductParty ID 42424G | 1..40 42426G |
| Delivery Information 42432C | PreviousDelivery 42430G | | 0..1 42432G | | |
| | | ID 42436G | 1 42438G | BusinessTrans-actionDocumentID 42440G | 1..35 42442G |
| | | Received Quantity 42446G | 0..1 42448G | Quantity 42449G | 19,6 42450G |
| | | Receipt DateTime 42454G | 0..1 42456G | DateTime 42458G | |
| | Cumulative Delivery 42462G | | 0..1 42464G | | |

Fig. 424N

| | | | | |
|---|---|---|---|---|
| DeliveryScheduleNotification 42424 | | | | |
| DeliverySchedule 42434 | | | | |
| Item 42464A | | | | |
| Delivery Information 42432C | Validity Period 42468G | 0..1 42470G | DateTimePeriod 42472G | |
| | ReceivedQuantity 42476G | 1 42478G | Quantity 42480G | 19,6 42482G |
| | Reconcillation DateTime 42486G | 0..1 42488G | DateTime 42490G | |
| | Reconcilliation Quantity 42494G | 0..1 42496G | Quantity 42498G | 19,6 42400H |
| Schedule Line 42434C | Schedule Line 42404H | 1..n 42406H | DeliveryScheduleItemLine 42408H | |
| | CommitmentCode 42412H | 1 42414H | ScheduleLine ComitmentCode 42416H | 3 42418H |

Fig. 424O

| | | | | | |
|---|---|---|---|---|---|
| DeliveryScheduleNotification 42424 | | | | | |
| DeliverySchedule 42434 | | | | | |
| Item 42464A | | | | | |
| Schedule Line 42434C | ProductChangeID 42422H | 0..1 42424H | ProductChangeID 42426H | 1..25 42428H |
| | DeliveryPeriod 42432H | 0..1 42434H | DateTimePeriod 42436H | |
| | PickUpPeriod 42440H | 0..1 42442H | DateTimePeriod 42444H | |
| | Quantity 42448H | 1 42450H | Quantity 42452H | 19,6 42454H |
| | Note 42458H | 0..1 42460H | Note 42462H | 1..132 42464H |
| Note 42468H | | 0..1 42470H | Note 42472H | 1..132 42474H |

Fig. 427A

| Package 42700 | L1 42702 | L2 42704 | L3 42706 | L4 42708 | Occ427 42710 | Datatype 42712 |
|---|---|---|---|---|---|---|
| InvoiceIssued Message 42714 | InvoiceIssued Message 42716 | | | | 1 42718 | MDT:InvoiceIssued Message 42720 |
| Invoice Issued 42722 | | InvoiceIssued 42724 | | | 1 42726 | GDT:InvoiceIssued 42728 |
| | | | BaseInvoiceID 42730 | | 1 42732 | GDT:Business TransactionDocumentID 42734 |
| | | | Cancellation InvoiceIndicator 42736 | | 1 42738 | GDT:Invoice CancellationInvoice Indicator 42740 |
| | | | IntraCorporate Indicator 42742 | | 1 42744 | GDT:IntraCorporate Indicator 42746 |
| Item 42748 | | | Item 42750 | | 1..n 42752 | GDT:Item 42754 |
| | | | | BaseInvoice ItemID 42756 | 1 42758 | GDT:BusinessTrans-actionDocumentItemID 42760 |

Fig. 427B

| | | | | | | | |
|---|---|---|---|---|---|---|---|
| InvoiceIssuedMessage 42714 | | | | | | | |
| InvoiceIssued 42722 | | | | | | | |
| Item 42748 | | | | | BilledQuantity 42762 | 0..1 42764 | GDT:Quantity 42769 |
| | | | | | BilledValue 42768 | 0..1 42770 | GDT:Amount 42772 |
| Business Transaction Document Reference 42774 | | | | | SalesOrder Reference 42776 | 0..1 42778 | GDT:BusinessTransaction DocumentReference 42780 |
| | | | | | Delivery Reference 42782 | 0..1 42784 | GDT:BusinessTransaction DocumentReference 42786 |

FIG. 430A

| Package 43000 | L1 43002 | L2 43004 | L3 43006 | L4 43008 | L5 43010 | L6 43012 | Crd 43014 | GDT 43016 | Lgh 43020 |
|---|---|---|---|---|---|---|---|---|---|
| Product Activity Message 43026 | Product Activity Message 43028 | | | | | | | ProductActivityMessage 43030 | |
| Message Header 43036 | | Message Header 43040 | | | | | 1 43042 | BusinessDocument MessageHeader 43044 | |
| | | | ID 43052 | | | | 1 43054 | BusinessDocument MessageID 43056 | 1..35 43058 |
| | | | Creation DateTime 43064 | | | | 1 43066 | DateTime 43068 | |
| | | | Sender Party 43072 | | | | 0..1 43074 | BusinessDocument MessageHeader Party 43076 | |
| | | | | InternalID 43084 | | | 0..1 43086 | PartyInternalID 43088 | |
| | | | | StandardID 43092 | | | 0..n 43094 | PartyStandardID 43096 | |

FIG. 430B

| ProductActivityMessage 43026 | | | | | | |
|---|---|---|---|---|---|---|
| Message Header 43036 | | Recipient Party 43002A | | 0..1 43004A | BusinessDocumentMessageHeaderParty 43006A | |
| | | | InternalID 43014A | 0..1 43016A | PartyInternalID 43018A | |
| | | | StandardID 43022A | 0..n 43024A | PartyStandardID 43026A | |
| Product Activity 43038 | Product Activity 43032A | | | 1 43034A | ProductActivity 43036A | |
| | | Validity Period 43040A | | 0..1 43042A | DateTimePeriod 43044A | |
| | | | StartDateTime 43052A | 0..1 43054A | DateTime 43056A | |
| | | | EndDateTime 43062A | 0..1 43064A | DateTime 43066A | |
| Party 43072A | | Buyer Party 43078A | | 0..1 43080A | BusinessTransactionDocumentParty 43082A | |
| | | | InternalID 43090A | 0..1 43092A | PartyInternalID 43094A | 1..10 43096A |

FIG. 430C

ProductActivityMessage 43026

ProductActivity 43038

| | | | | | |
|---|---|---|---|---|---|
| Party 43072A | | StandardID 43000B | 0..n 43002B | PartyStandardID 43004B | 1.. 13 / 9 43006B |
| | | BuyerID 43012B | 0..1 43014B | PartyPartyID 43016B | 1..10 43018B |
| | | VendorID 43024B | 0..1 43026B | PartyPartyID 43028B | 1..10 43030B |
| | VendorParty 43036B | | 0..1 43038B | BusinessTransaction DocumentParty 43040B | |
| | | InternalID 43048B | 0..1 43050B | PartyInternalID 43052B | 1..10 43054B |
| | | StandardID 43058B | 0..n 43060B | PartyStandardID 43062B | 1.. 13 / 9 43064B |
| | | BuyerID 43070B | 0..1 43072B | PartyPartyID 43074B | 1..10 43076B |
| | | VendorID 43082B | 0..1 43084B | PartyPartyID 43086B | 1..10 43088B |
| BusinessTransaction DocumentRequest 43074A | InboundDelivery Reference 43094B | | 0..n 43096B | BusinessTransaction DocumentReference 43098B | |

FIG. 430D

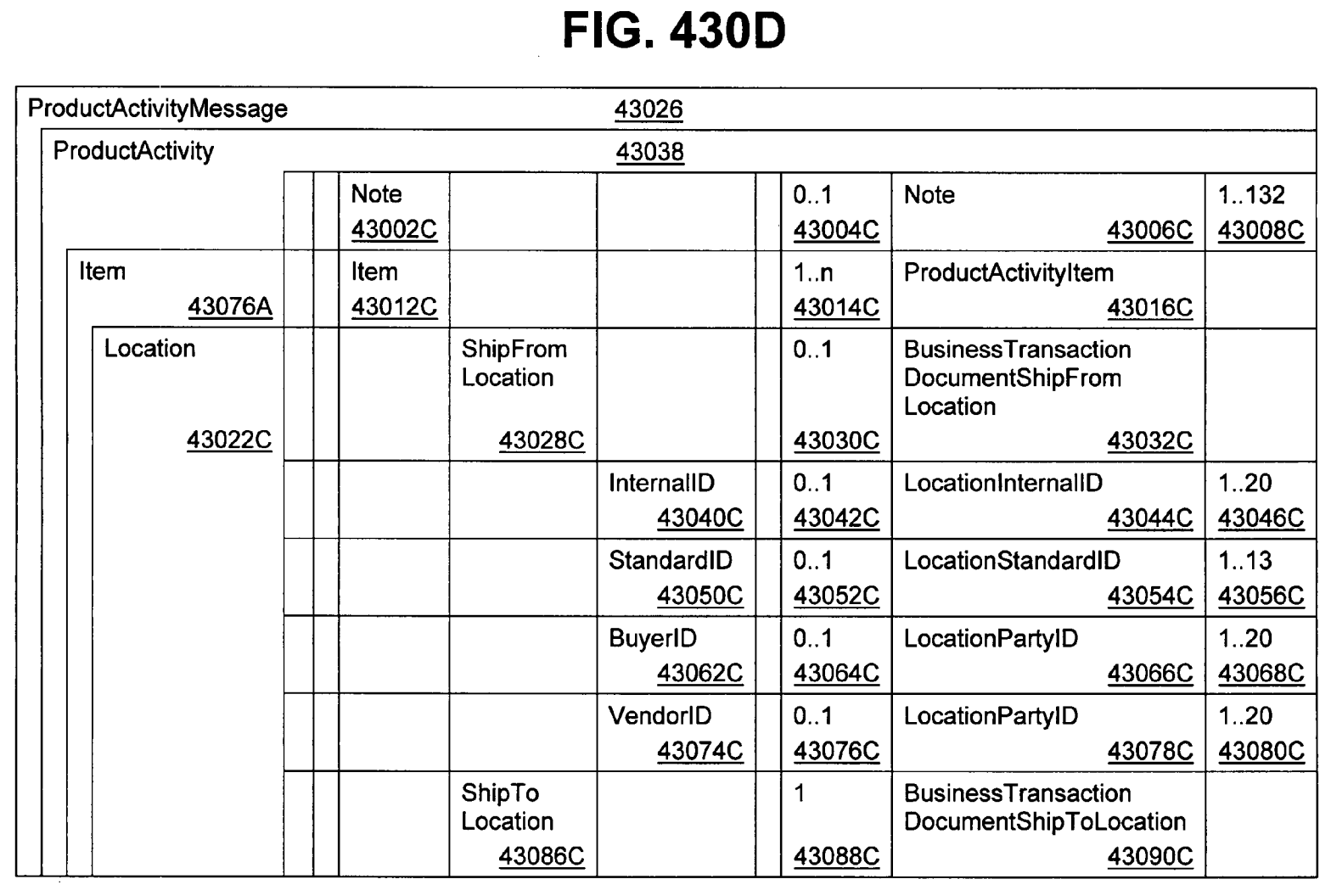

| | | | | | | |
|---|---|---|---|---|---|---|
| ProductActivityMessage 43026 | | | | | | |
| ProductActivity 43038 | | | | | | |
| | Note 43002C | | | 0..1 43004C | Note 43006C | 1..132 43008C |
| Item 43076A | Item 43012C | | | 1..n 43014C | ProductActivityItem 43016C | |
| Location 43022C | | ShipFrom Location 43028C | | 0..1 43030C | BusinessTransaction DocumentShipFrom Location 43032C | |
| | | | InternalID 43040C | 0..1 43042C | LocationInternalID 43044C | 1..20 43046C |
| | | | StandardID 43050C | 0..1 43052C | LocationStandardID 43054C | 1..13 43056C |
| | | | BuyerID 43062C | 0..1 43064C | LocationPartyID 43066C | 1..20 43068C |
| | | | VendorID 43074C | 0..1 43076C | LocationPartyID 43078C | 1..20 43080C |
| | | ShipTo Location 43086C | | 1 43088C | BusinessTransaction DocumentShipToLocation 43090C | |

FIG. 430E

| | | | | | |
|---|---|---|---|---|---|
| ProductActivityMessage 43026 | | | | | |
| ProductActivity 43038 | | | | | |
| Item 43076A | | | | | |
| Location 43022C | | InternalID 43098C | 0..1 43000D | LocationInternalID 43002D | 1..20 43004D |
| | | StandardID 43008D | 0..1 43010D | LocationStandardID 43012D | 1..13 43014D |
| | | BuyerID 43020D | 0..1 43022D | LocationPartyID 43024D | 1..20 **26D |
| | | VendorID 43032D | 0..1 43034D | LocationPartyID 43036D | 1..20 43038D |
| Product Informa-tion 43024C | Product 43044D | | 1 46D | BusinessTransaction DocumentProduct 43048D | |
| | | InternalID 43056D | 0..1 43058D | ProductInternalID 43060D | 1..40 43062D |
| | | StandardID 43066D | 0..1 43068D | ProductStandardID 43070D | 14 43072D |
| | | BuyerID 43078D | 0..1 43080D | ProductPartyID 43082D | 1..40 43084D |

FIG.430F

| | | | | | | |
|---|---|---|---|---|---|---|
| ProductActivityMessage 43026 | | | | | | |
| ProductActivity 43038 | | | | | | |
| Item 43076A | | | | | | |
| Product Information 43024C | | VendorID 43090D | 0..1 43092D | ProductPartyID 43094D | 1..40 43096D |
| | | PackageQuantity 43002E | 0..1 43004E | Quantity 43006E | 19,6 43008E |
| | | Discontinuation Indicator 43012E | 0..1 43014E | ProductDiscontinuation Indicator 43016E | |
| Inventory 43026C | Inventory 43020E | | 0..1 43022D | ProductActivity ItemInventory 43024E | |
| | | StatusDateTime 43030E | 0..1 43032E | DateTime 43034E | |
| | | UnrestrictedUse Quantity 43040E | 0..1 43042E | Quantity 43044E | 19,6 43046E |
| | | QualityInspection Quantity 43052E | 0..1 43054E | Quantity 43056E | 19,6 43058E |
| | | BlockedQuantity 43062E | 0..1 43064E | Quantity 43066E | 19,6 43068E |

FIG. 430G

ProductActivityMessage 43026

ProductActivity 43038

Item 43076A

| | | | | |
|---|---|---|---|---|
| Inventory 43026C | | PromotionQuantity 43072E | 0..1 43074E | Quantity 43076E | 19,6 43078E |
| | Consignment Inventory 43082E | | 0..1 43084E | ProductActivity ItemInventory 43086E | |
| | | StartDateTime 43090E | 0..1 43092E | DateTime 43094E | |
| | | UnrestrictedUseQuantity 43098E | 0..1 43000F | Quantity 43002F | 19,6 43004F |
| | | QualityInspectionQuantity 43008F | 0..1 43010F | Quantity 43012F | 19,6 43014F |
| | | BlockedQuantity 43018E | 0..1 43020E | Quantity 43022F | 19,6 43024F |
| | | PromotionQuantity 43028F | 0..1 43030F | Quantity 43032F | 19,6 43034F |

FIG. 430H

| | | | | | |
|---|---|---|---|---|---|
| ProductActivityMessage 43026 | | | | | |
| ProductActivity 43038 | | | | | |
| Item 43076A | | | | | |
| | SalesTimeSeries 43038F | | | 0..1 43040F | QuantityTimeSeries 43042F |
| | | Item 43048F | | 0..n 43050F | |
| | | | ValidityPeriod 43056F | 1 43058F | DateTime Period 43060F |
| | | | Quantity 43066F | 1 43068F | Quantity 43070F |
| | PromotionSalesTimeSeries 43076F | | | 0..1 43078F | QuantityTime Series 43080F |
| | | Item 43086F | | 0..n 43088F | |
| | | | ValidityPeriod 43092F | 1 43094F | DateTime Period 43096F |
| | | | Quantity 43000G | 1 43002G | Quantity 43004G |
| | SalesForecastTimeSeries 43008G | | | 0..1 43010G | QuantityTime Series 43012G |

FIG. 430I

| | | | | |
|---|---|---|---|---|
| ProductActivityMessage 43026 | | | | |
| ProductActivity 43038 | | | | |
| Item 43076A | | | | |
| | Item 43018G | | 0..n 43020G | |
| | | ValidityPeriod 43024G | 1 43026G | DateTimePeriod 43028G |
| | | Quantity 43032G | 1 43034G | Quantity 43036G |
| PromotionSales ForecastTimeSeries 43040G | | | 0..1 43042G | QuantityTimeSeries 43044G |
| | Item 43050G | | 0..n 43052G | |
| | | Validity Period 43056G | 1 43058G | DateTimePeriod 43060G |
| | | Quantity 43064G | 1 43066G | Quantity 43068G |
| OrderForecastTime Series 43072G | | | 0..1 43074G | QuantityTimeSeries 43076G |

FIG.430J

| | | | | | |
|---|---|---|---|---|---|
| ProductActivityMessage 43026 | | | | | |
| ProductActivity 43038 | | | | | |
| Item 43076A | | | | | |
| | Item 43082G | | 0..n 43084G | | |
| | | ValidityPeriod 43090G | 1 43092G | DateTimePeriod 43094G | |
| | | Quantity 43000H | 1 43002H | Quantity 43004H | |
| PromotionOrder ForecastTimeSeries 43010H | | | 0..1 43012H | QuantityTime Series 43014H | |
| | Item 43020H | | 0..n 43022H | | |
| | | ValidityPeriod 43026H | 1 43028H | DateTimePeriod 43030H | |
| | | Quantity 43034H | 1 43036H | Quantity 43038H | |
| Consumption TimeSeries 43042H | | | 0..1 43044H | QuantityTimeSeries 43046H | |
| | Item 43052H | | 0..n 43054H | | |

FIG. 430K

ProductActivityMessage 43026

ProductActivity 43038

Item 43076A

| | | | | |
|---|---|---|---|---|
| | | ValidityPeriod 43058H | 1 43060H | DateTimePeriod 43062H |
| | | Quantity 43066H | 1 43068H | Quantity 43070H |
| ConsumptionForecastTime Series 43074H | | | 0..1 43076H | QuantityTimeSeries 43078H |
| | Item 43084H | | 0..n 43086H | |
| | | ValidityPeriod 43090H | 1 43092H | DateTimePeriod 43094H |
| | | Quantity 43098H | 1 43000I | Quantity 43002I |
| OnOrderTime Series 43006I | | | 0..1 43008I | QuantityTimeSeries 43010I |
| | Item 43016I | | 0..n 43018I | |
| | | ValidityPeriod 43022I | 1 43024I | DateTimePeriod 43026I |

FIG. 430L

ProductActivityMessage 43026

ProductActivity 43038

Item 43076A

| | | | | |
|---|---|---|---|---|
| | | Quantity 43030I | 1 43032I | Quantity 43034I |
| OutofStockTimeSeries 43038I | | | 0..1 43040I | QuantityTimeSeries 43042I |
| | Item 43048I | | 0..n 43050I | |
| | | ValidityPeriod 43056I | 1 43058I | DateTimePeriod 43060I |
| | | Quantity 43066I | 1 43068I | Quantity 43070I |

Fig. 433A

| Package 43300 | L 1 43302 | L2 43304 | L3 43306 | L4 43308 | L5 43310 | L6 43312 | Occ 43314 | Type 43316 | Name 43318 |
|---|---|---|---|---|---|---|---|---|---|
| Payment Due Message 43320 | Payment Due Message 43322 | | | | | | | MDT 43324 | PaymentDue Message 43326 |
| Payment Due 43328 | | Payment Due 43330 | | | | | 1 43332 | AGDT 43334 | PaymentDue 43336 |
| | | | Base Business Transaction DocumentID 43338 | | | | 1 43340 | BGDT 43342 | BusinessTransaction DocumentID 43344 |
| | | | Base Business Transaction Document TypeCode 43346 | | | | 1 43348 | BGDT 43350 | Business Transaction DocumentType Code 43352 |
| | | | Base Business TransactionD ocument Date 43354 | | | | 1 43356 | BGDT 43358 | Date 43360 |

Fig. 433B

Payment Due Message 43320

Payment Due 43328

| | | | | | |
|---|---|---|---|---|---|
| Party 43362 | PayerParty 43368 | | 1 43370 | AGDT 43372 | BusinessTransactionDocumentParty 43374 |
| | | InternalID 43376 | 1 43378 | BGDT 43380 | PartyID 43382 |
| | PayeeParty 43384 | | 1 43386 | AGDT 43388 | BusinessTransactionDocumentParty 43390 |
| | | InternalID 43392 | 1 43394 | BGDT 43396 | PartyID 43398 |
| | DebtorParty 43300A | | 0..1 43302A | AGDT 43304A | BusinessTransactionDocumentParty 43306A |
| | | InternalID 43308A | 1 43310A | BGDT 43312A | PartyID 43314A |
| | CreditorParty 43316A | | 0..1 43318A | AGDT 43320A | BusinessTransactionDocumentParty 43322A |
| | | InternalID 43324A | 1 43326A | BGDT 43328A | PartyID 43330A |
| Business Transaction Document Reference 43364 | OriginInvoice Reference 43332A | | 0..1 43334A | AGDT 43336A | BusinessTransactionDocument Reference 43338A |
| | | ID 43340A | 1 43342A | BGDT 43344A | BusinessTransactionDocumentID 43346A |

Fig. 433C

Payment Due Message 43320

Payment Due 43328

| | | | | | |
|---|---|---|---|---|---|
| Business Transaction Document Reference 43364 | Origin Vendor Invoice Reference 43348A | | 0..1 43350A | AGDT 43352A | BusinessTransactionDocument Reference 43354A |
| | | ID 43356A | 1 43358A | BGDT 43360A | BusinessTransaction DocumentID 43362A |
| | Invoice Reference 43364A | | 0..1 43366A | AGDT 43368A | BusinessTransaction DocumentReference 43370A |
| | | ID 43372A | 1 43374A | BGDT 43376A | BusinessTransaction DocumentID 43378A |
| Item 43366 | Item 43380A | | 1..n 43382A | AGDT 43384A | PaymentDueItem 43386A |
| | | Amount 43388A | 1 43390A | BGDT 43392A | Amount 43394A |
| | | Payment Currency 43396A | 0..1 43398A | BGDT 43300B | CurrencyCode 43302B |

Fig. 433D

Payment Due Message 43320

Payment Due 43328

| | | | | | |
|---|---|---|---|---|---|
| Item 43366 | FixedExchangeRate 43304B | | 0..1 43306B | AGDT 43308B | ExchangeRate 43310B |
| | GroupID 43312B | | 0..1 43314B | BGDT 43316B | BusinessTransactionDocumentItemGroupID 43318B |
| Payment Information 43320B | CashDiscountTerms 43324B | | 1 43326B | AGDT 43328B | CashDiscountTerms 43330B |
| | PaymentFormCode 43332B | | 0..1 43334B | AGDT 43336B | PaymentFormCode 43338B |
| Party 43322B | PayerParty 43340B | | 0..1 43342B | AGDT 43344B | BusinessTransactionDocumentParty 43346B |
| | | InternalID 43348B | 1 43350B | BGDT 43352B | PartyID 43354B |
| | PayeeParty 43356B | | 0..1 43358B | AGDT 43360B | BusinessTransactionDocumentParty 43362B |

CONSISTENT SET OF INTERFACES DERIVED FROM A BUSINESS OBJECT MODEL

CROSS-REFERENCE TO RELATED APPLICATIONS

The following identified U.S. patent applications are relied upon and are incorporated herein by reference in this application in their entirety:

U.S. Patent Application No. 60/577,453, entitled "Interfaces Derived from a Business Object Model Shared by the Heterogeneous Applications," filed on Jun. 4, 2004.

U.S. Patent Application No. 60/581,252, entitled "Interfaces Derived from a Business Object Model Shared by Heterogeneous Applications," filed on Jun. 18, 2004.

U.S. Patent Application No. 60/582,949, entitled "Interfaces Derived from a Business Object Model Shared by Heterogeneous Applications," filed on Jun. 25, 2004.

U.S. Patent Application No. 60/656,598, entitled "Interfaces Derived from a Business Object Model Shared by Heterogeneous Applications," filed on Feb. 25, 2005.

U.S. Patent Application No. 60/669,310, entitled "Interfaces Derived from a Business Object Model Shared by Heterogeneous Applications," filed on Apr. 7, 2005.

U.S. patent application Ser. No. 11/145,464, entitled "Consistent Set Of Interfaces Derived From A Business Object Model," filed on Jun. 3, 2005.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to the generation and use of consistent interfaces derived from a business object model. More particularly, the invention relates to the generation and use of consistent interfaces that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

The United Nations established the United Nations Centre for Trade Facilitation and Electronic Business ("UN/CEFACT") to improve worldwide coordination for the exchange of information. The primary focus of UN/CEFACT is to facilitate national and international transactions by simplifying and harmonizing processes, procedures and information flow to contribute to the growth of global commerce. UN/CEFACT is still in its early stages of developing such a harmonized system. Additional information regarding UN/CEFACT can be found at http://www.unece.org/cefact/.

Currently many standards exist, which offer a variety of interfaces used to exchange business information. Most of these interfaces, however, apply to only one specific industry, and are not consistent between the different standards. Moreover, a number of these interfaces are not consistent within an individual standard. Thus, there is a need for the harmonization of interfaces across these standards and across various industries.

SUMMARY OF THE INVENTION

Methods and systems consistent with the present invention facilitate e-commerce by providing consistent interfaces that can be used during a business transaction. Such business entities may include different companies within different industries. For example, one company may be in the chemical industry, while another company may be in the automotive industry. The business entities also may include different businesses within a given industry, or they may include different departments within a given company.

The interfaces are consistent across different industries and across different business units because they are generated using a single business object model. The business object model defines the business-related concepts at a central location for a number of business transactions. In other words, the business object model reflects the decisions made about modeling the business entities of the real world acting in business transactions across industries and business areas. The business object model is defined by the business objects and their relationships to each other (overall net structure).

A business object is a capsule with an internal hierarchical structure, behavior offered by its operations, and integrity constraints. Business objects are semantically disjoint, i.e., the same business information is represented once. The business object model contains all of the elements in the messages, user interfaces and engines for these business transactions. Each message represents a business document with structured information. The user interfaces represent the information that the users deal with, such as analytics, reporting, maintaining or controlling. The engines provide services concerning a specific topic, such as pricing or tax.

Methods and systems consistent with the present invention generate interfaces from the business object model by assembling the elements that are required for a given transaction in a corresponding hierarchical manner. Because each interface is derived from the business object model, the interface is consistent with the business object model and with the other interfaces that are derived from the business object model. Moreover, the consistency of the interfaces is also maintained at all hierarchical levels. By using consistent interfaces, each business entity can easily exchange information with another business entity without the need for human interaction, thus facilitating business transactions.

Methods and systems consistent with the present invention provide a consistent set of interfaces that are suitable for use with more than one industry. This consistency is reflected at a structural level as well as through the semantic meaning of the elements in the interfaces.

Methods and systems consistent with the present invention provide an object model and, from this object model, derive two or more interfaces that are consistent.

Methods and systems consistent with the present invention provide a consistent set of interfaces suitable for use with a business scenario that spans across the components within a company. These components, or business entities, may be heterogeneous.

Additionally, methods and systems consistent with the present invention provide a consistent set of interfaces suitable for use with different businesses.

In accordance with methods consistent with the present invention, a method is provided for generating an invoice request in a data processing system. The method comprises the steps of providing a data structure comprising an invoice message entity and an invoice package, wherein the invoice package comprises an invoice entity, a party package and an item package, wherein the party package comprises a bill-to-party entity and a bill-from-party entity and the item package comprises an item entity arranged hierarchically using a hierarchy relationship and a price information package, wherein the price information package comprises a price entity, receiving values for the fields in the data structure, and storing the values into the data structure to generate the invoice request.

In accordance with methods consistent with the present invention, a method is provided for generating an invoice confirmation in a data processing system. The method comprises the steps of receiving an invoice request, responsive to the receiving step, providing a data structure comprising an invoice message entity and an invoice package, wherein the invoice package comprises an invoice entity, a party package and an item package, wherein the party package comprises a bill-to-party entity and a bill-from-party entity and the item package comprises an item entity arranged hierarchically using a hierarchy relationship and a price information package, wherein the price information package comprises a price entity, receiving values for the fields in the data structure, and storing the values into the data structure to generate the invoice confirmation.

Other systems, methods, features and advantages of the invention will be or will become apparent to one with skill in the art upon examination of the following figures and detailed description. It is intended that such additional systems, methods, features and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIGS. 25-251 depict the data type structures in accordance with methods and systems consistent with the present invention;

FIGS. 280A-K depict the element structure for the Invoice interfaces in accordance with methods and systems consistent with the present invention;

FIGS. 290A-G depict the element structure for the Purchase Requirement interfaces in accordance with methods and systems consistent with the present invention;

FIGS. 293A-D depict the element structure for the Source of Supply interface in accordance with methods and systems consistent with the present invention;

FIGS. 297A-Y depict the element structure for the Purchase Order interfaces in accordance with methods and systems consistent with the present invention;

FIGS. 300A-L depict the element structure for the Service Acknowledgement interfaces in accordance with methods and systems consistent with the present invention;

FIGS. 306A-O depict the element structure for the RFQ interfaces in accordance with methods and systems consistent with the present invention;

FIGS. 307A-C depict the element structure for the RFQ Cancellation interfaces in accordance with methods and systems consistent with the present invention;

FIGS. 308A-M depict the element structure for the Quote interfaces in accordance with methods and systems consistent with the present invention;

FIGS. 309A-D depict the element structure for the RFQ Request interfaces in accordance with methods and systems consistent with the present invention;

FIGS. 318-358 depict additional data type structures in accordance with methods and systems consistent with the present invention;

FIGS. 361A-AA depict the element structure for a CatalogueUpdateNotification message;

FIGS. 363A-Z depict the element structure for a CataloguePublicationRequest message;

FIGS. 365A-B depict the element structure for a CataloguePublicationTransmissionPackageNotification message;

FIGS. 367A-B depict the element structure for a CataloguePublicationConfirmation message;

FIGS. 369A-B depict the element structure for a CataloguePublicationTransmissionCancellationRequest message;

FIGS. 371A-B depict the element structure for a CataloguePublicationTransmissionCancellationConfirmation message;

FIGS. 373A-C depict the element structure for a CataloguePublicationTransmissionItemLockRequest message;

FIGS. 375A-B depict the element structure for a CataloguePublicationTransmissionitemLockConfirmation message;

FIGS. 378A-P depict the message data type element structure for the PurchaseOrderInformation interface;

FIGS. 381A-D depict the message data type element structure for the TaxDueMessage message;

FIGS. 384A-J depict the message data type element structure for the DeliveryInformation message;

FIG. 387A-C depict the element structure for PersonnelTimesheetMessage;

FIG. 389 depicts the data model for the CreditWorthinessQueryMessage message;

FIG. 390 depicts the message data type element structure for the CreditWorthinessMessage message;

Figure 393:
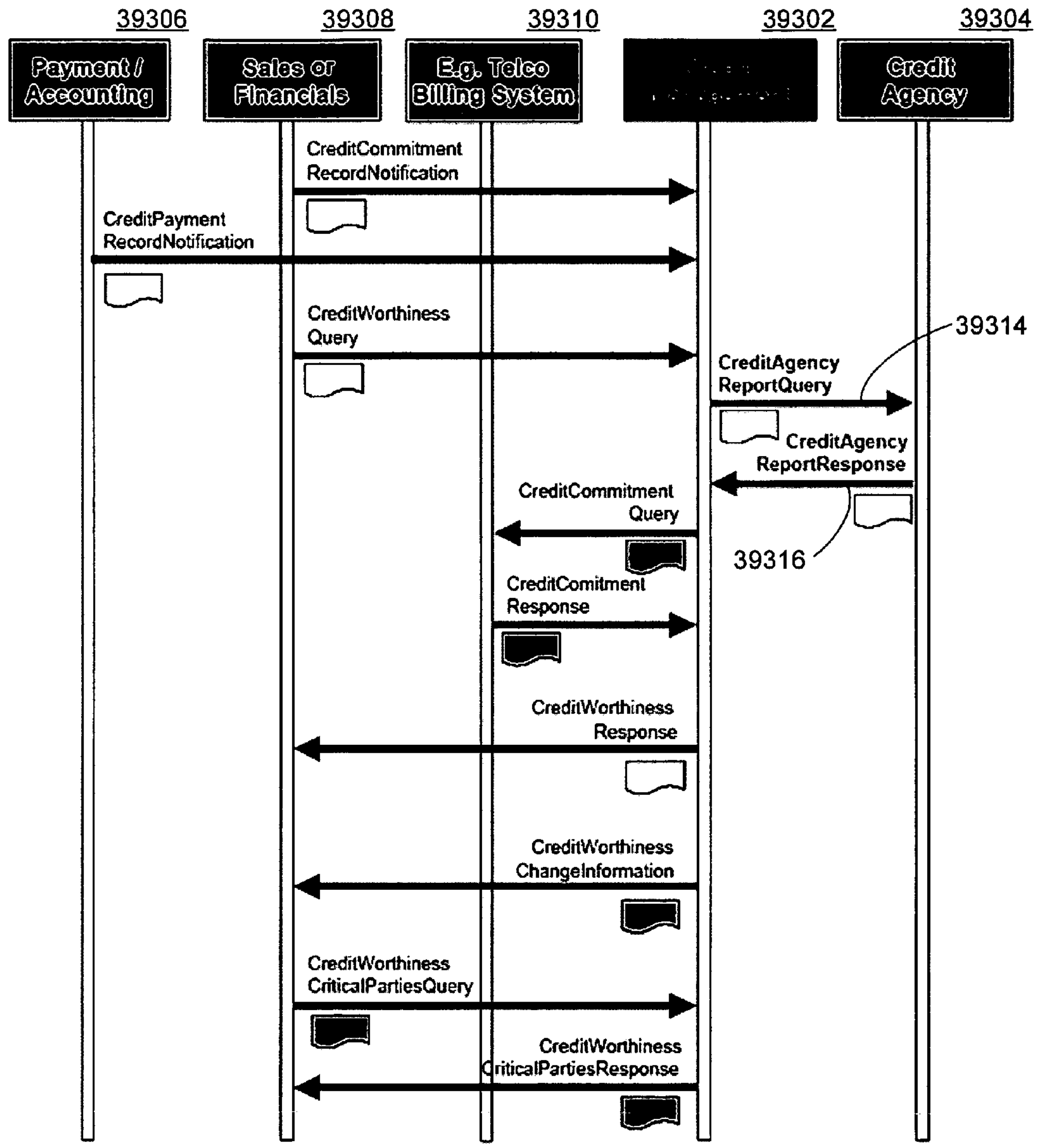
Figure 394:
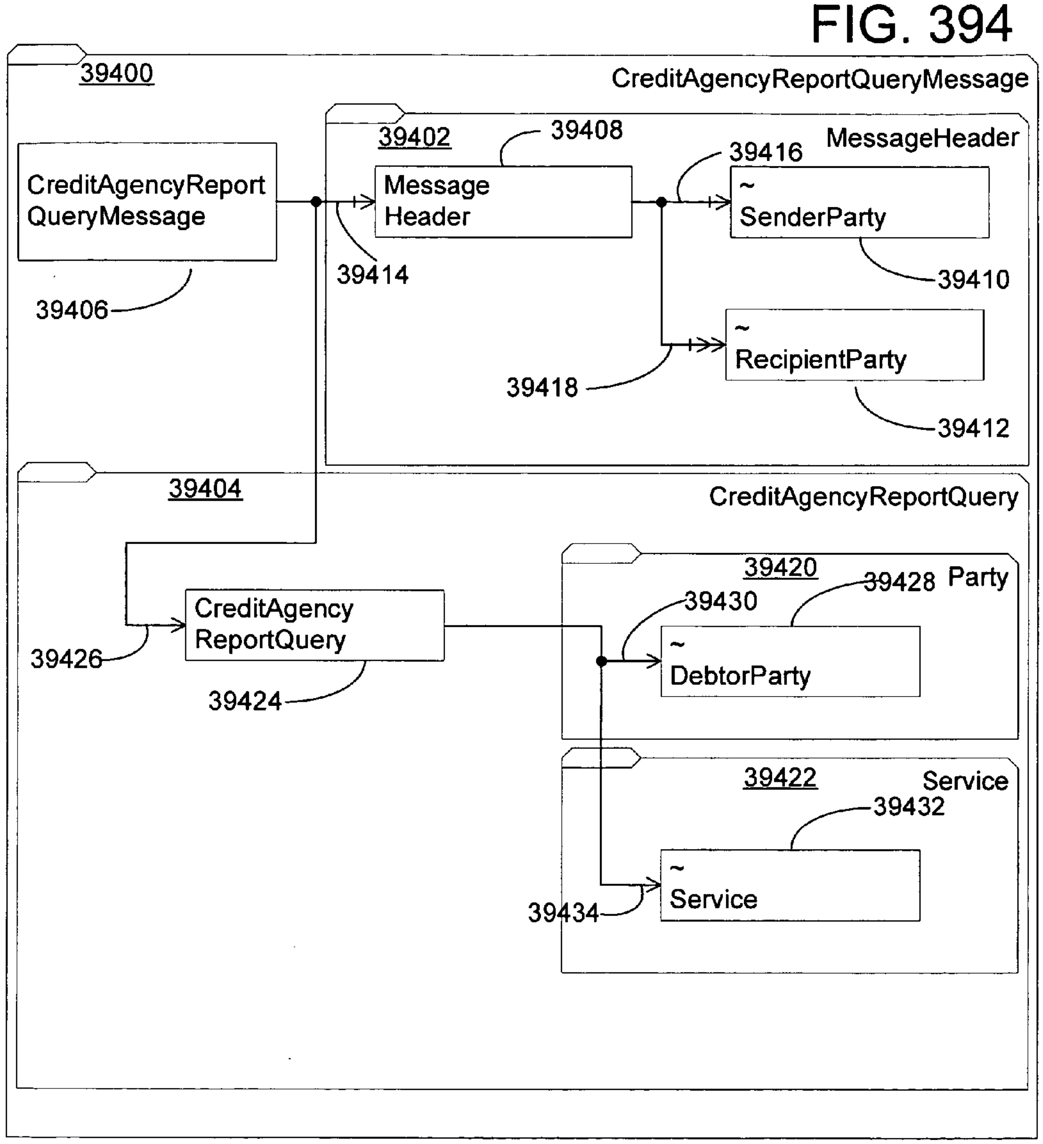
Figure 395A:
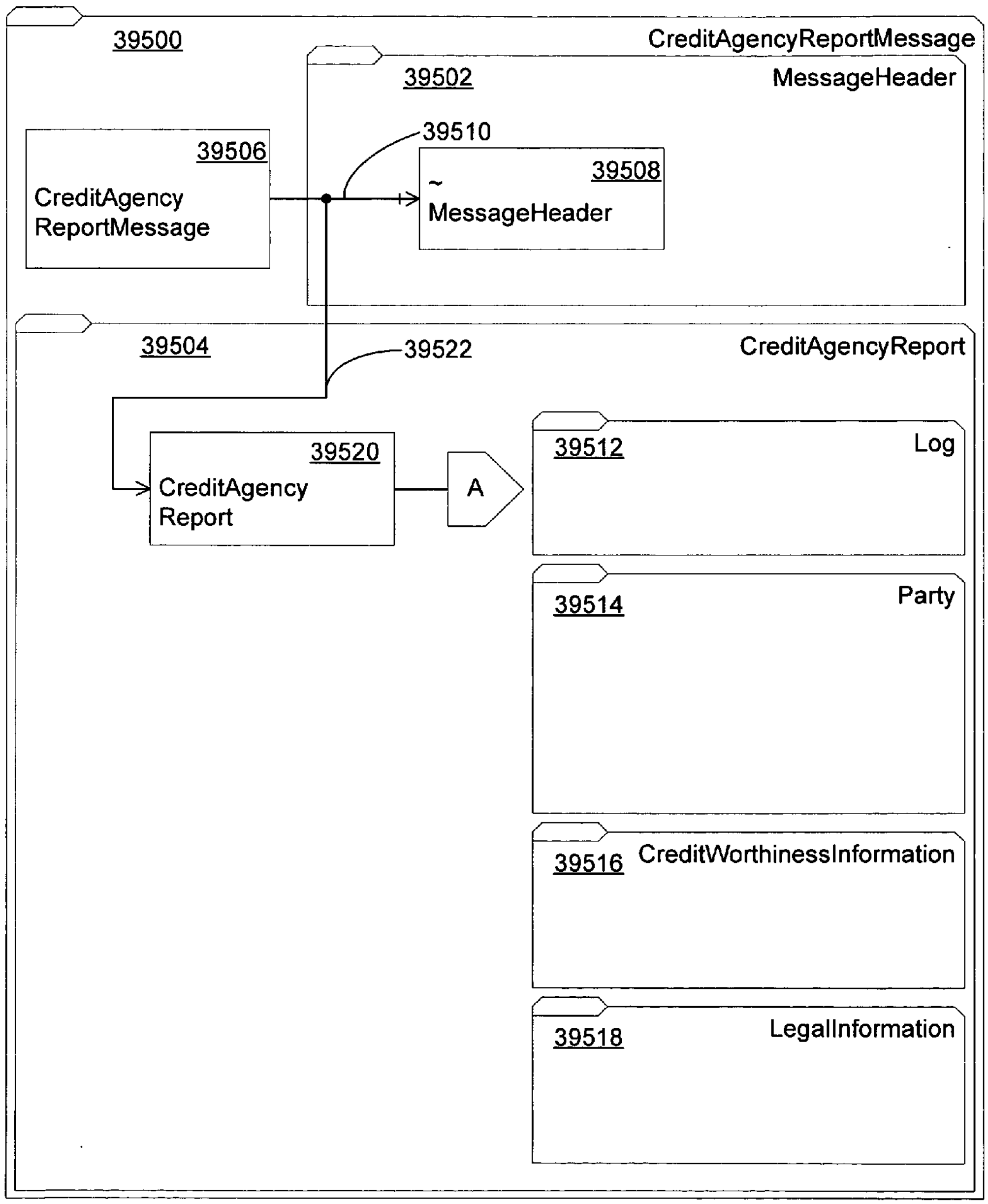
Figure 395B:
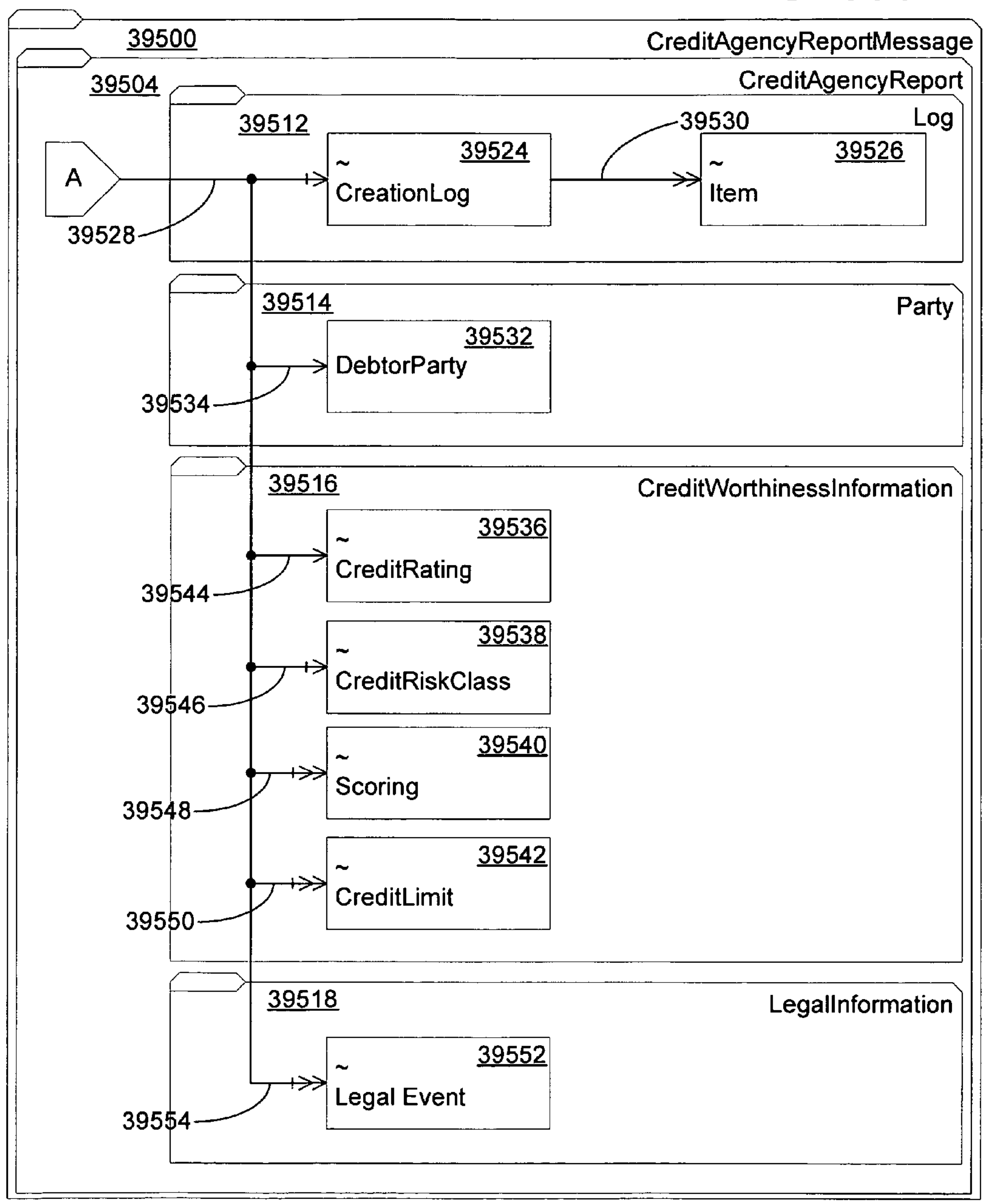
Figure 398:
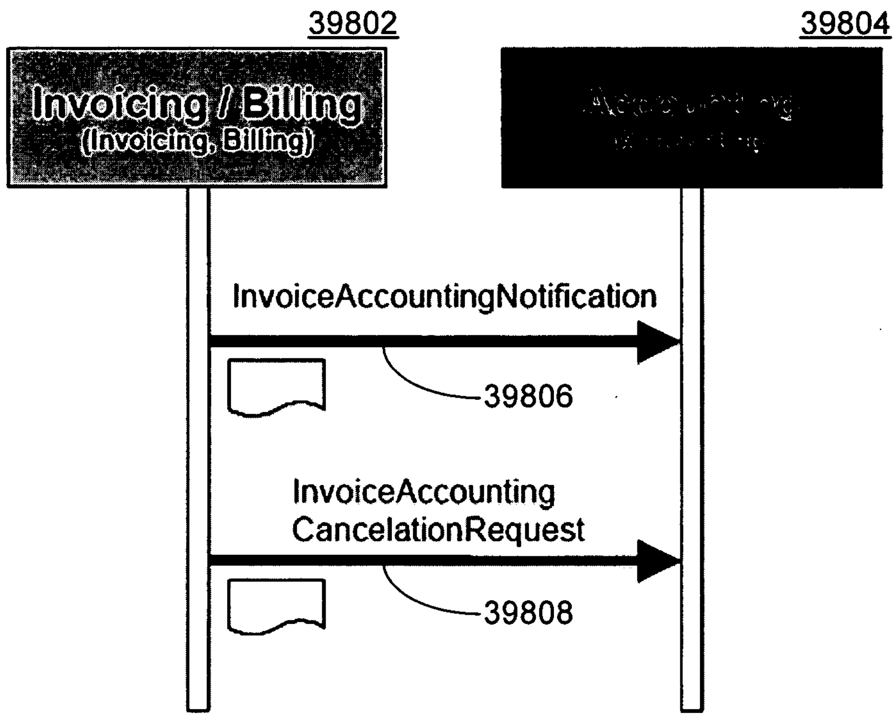
Figure 399:
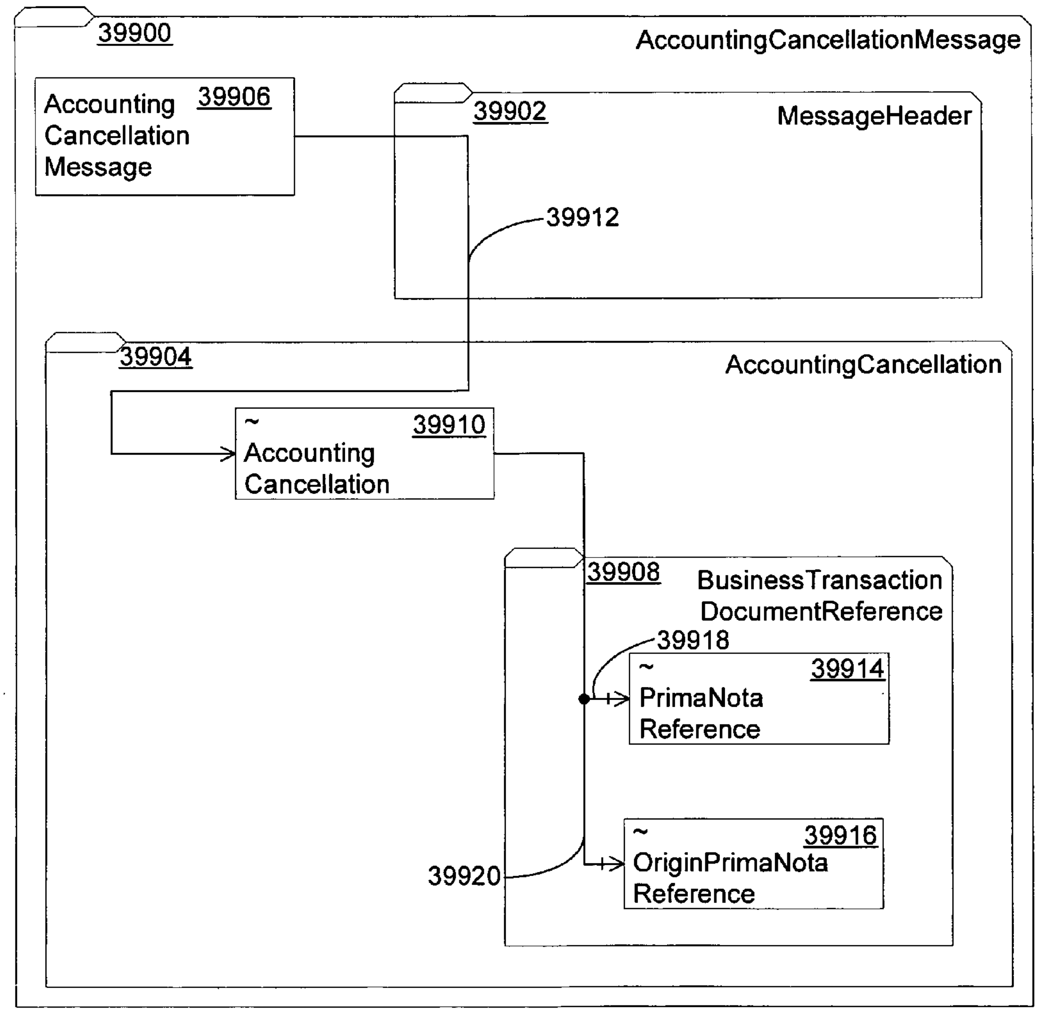
Figure 401:
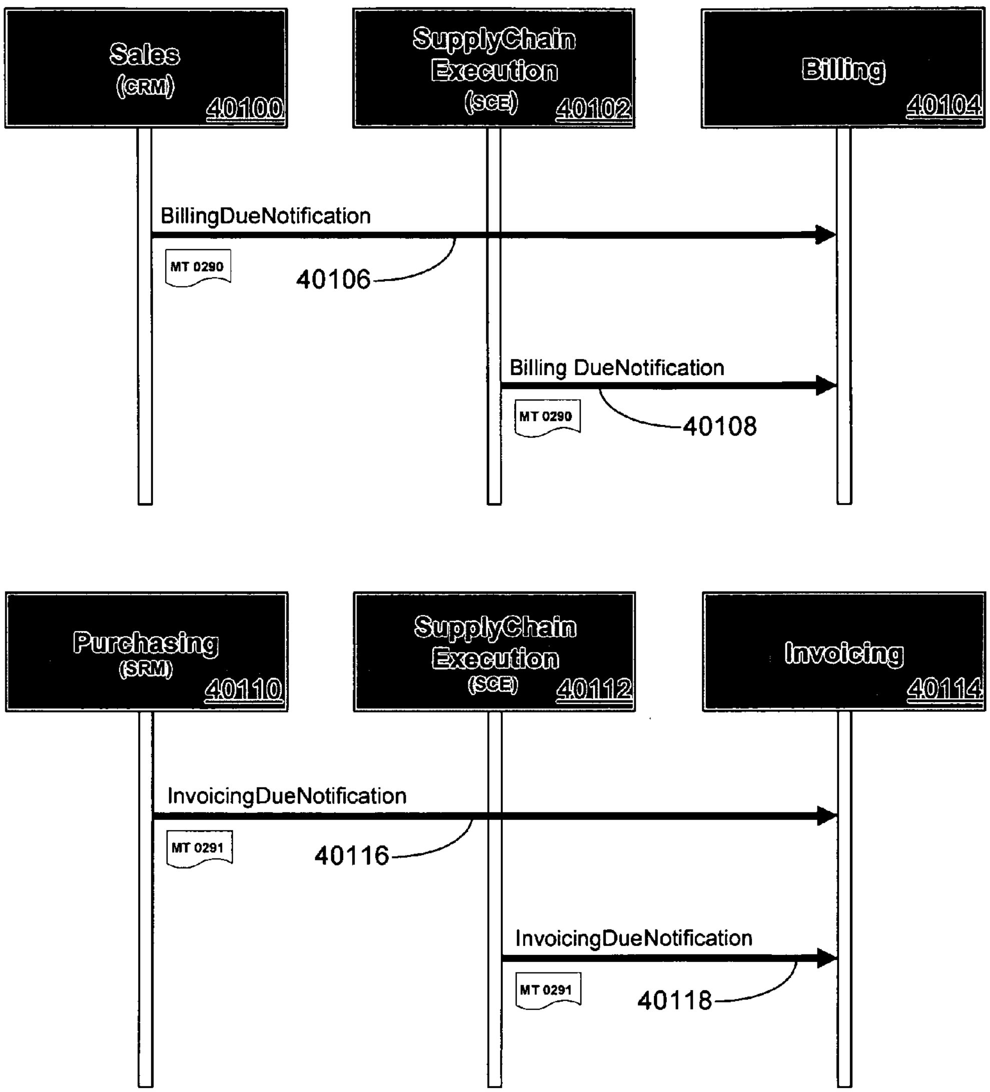
Figure 402A:
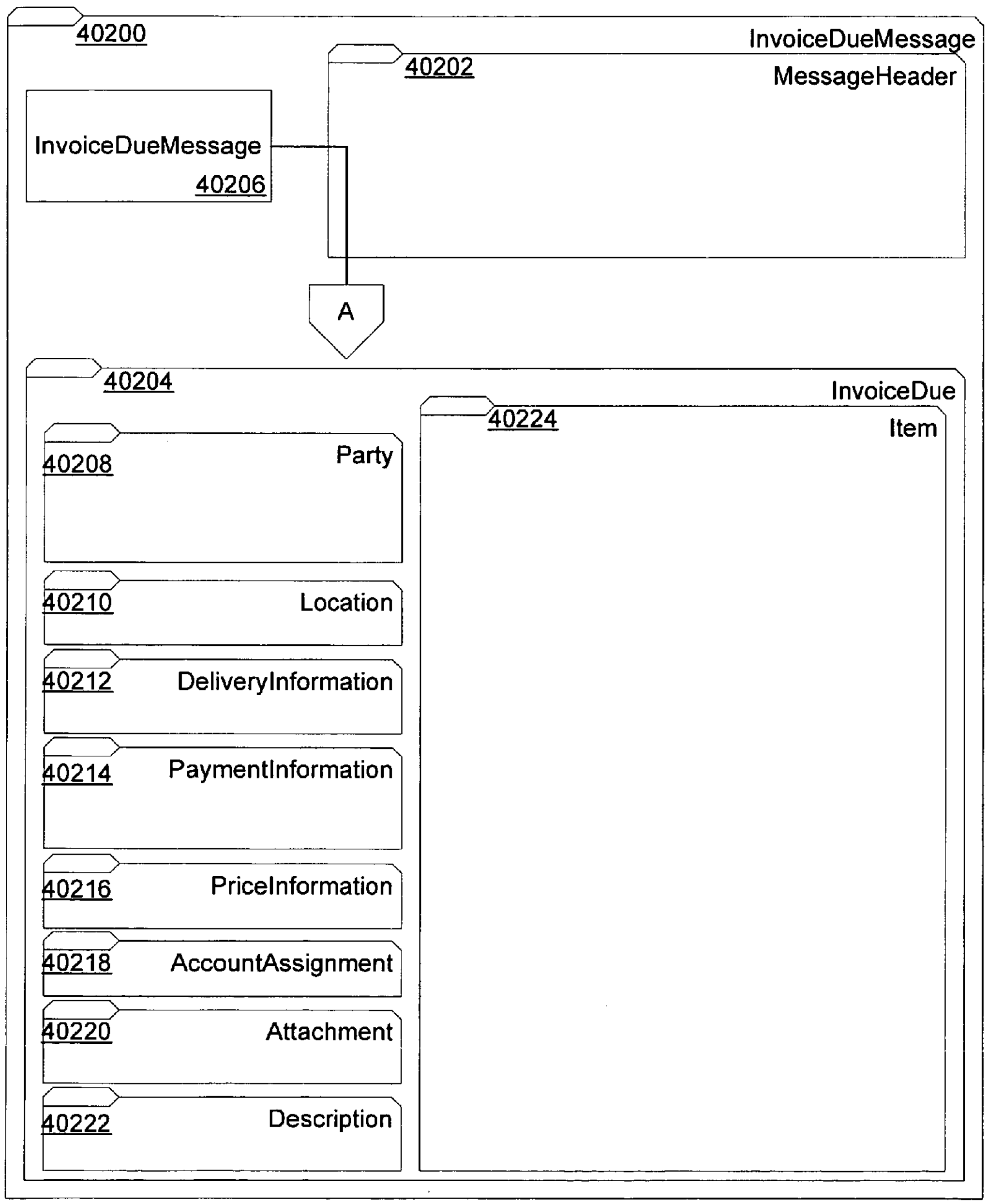
Figure 402B:
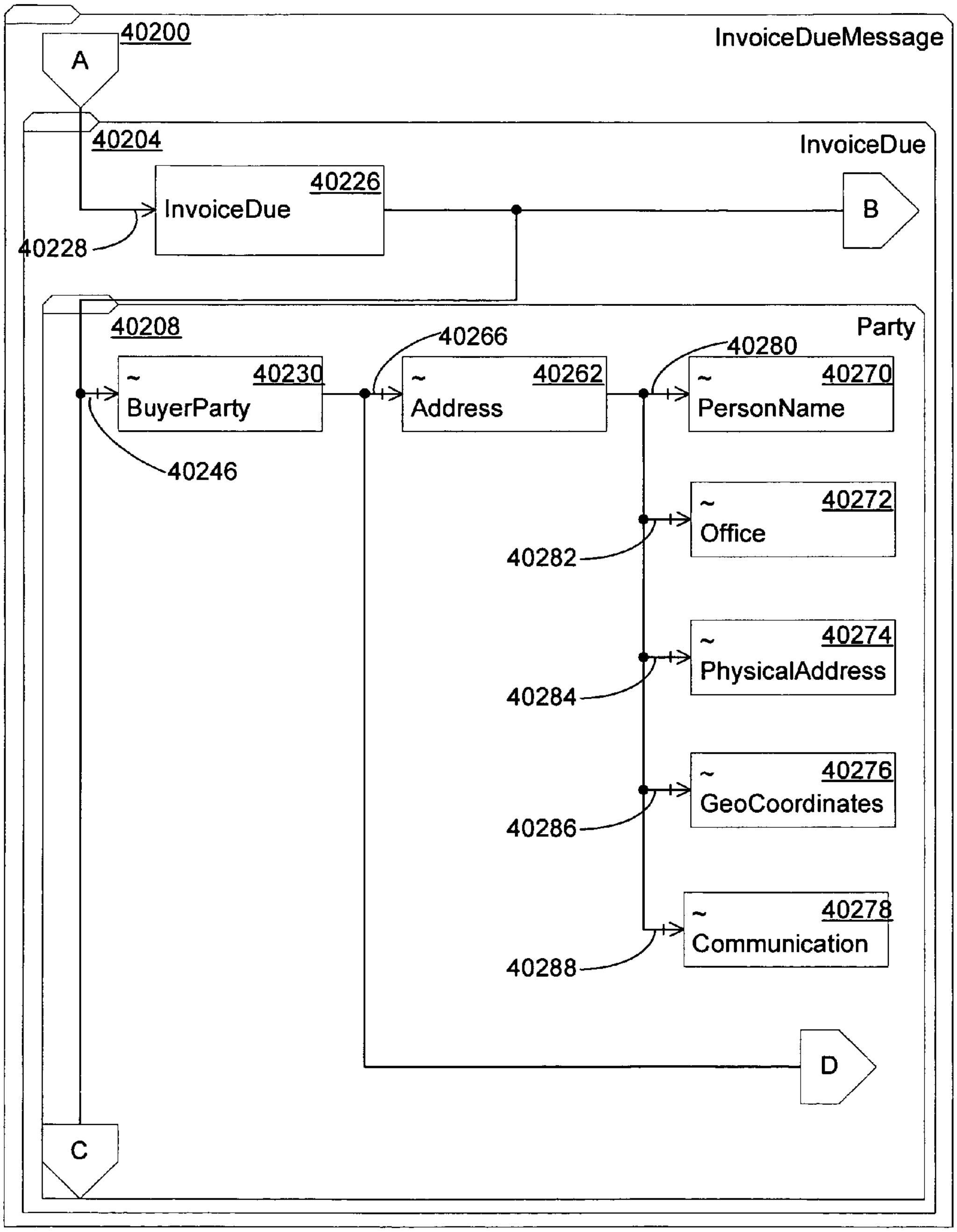
Figure 402C:
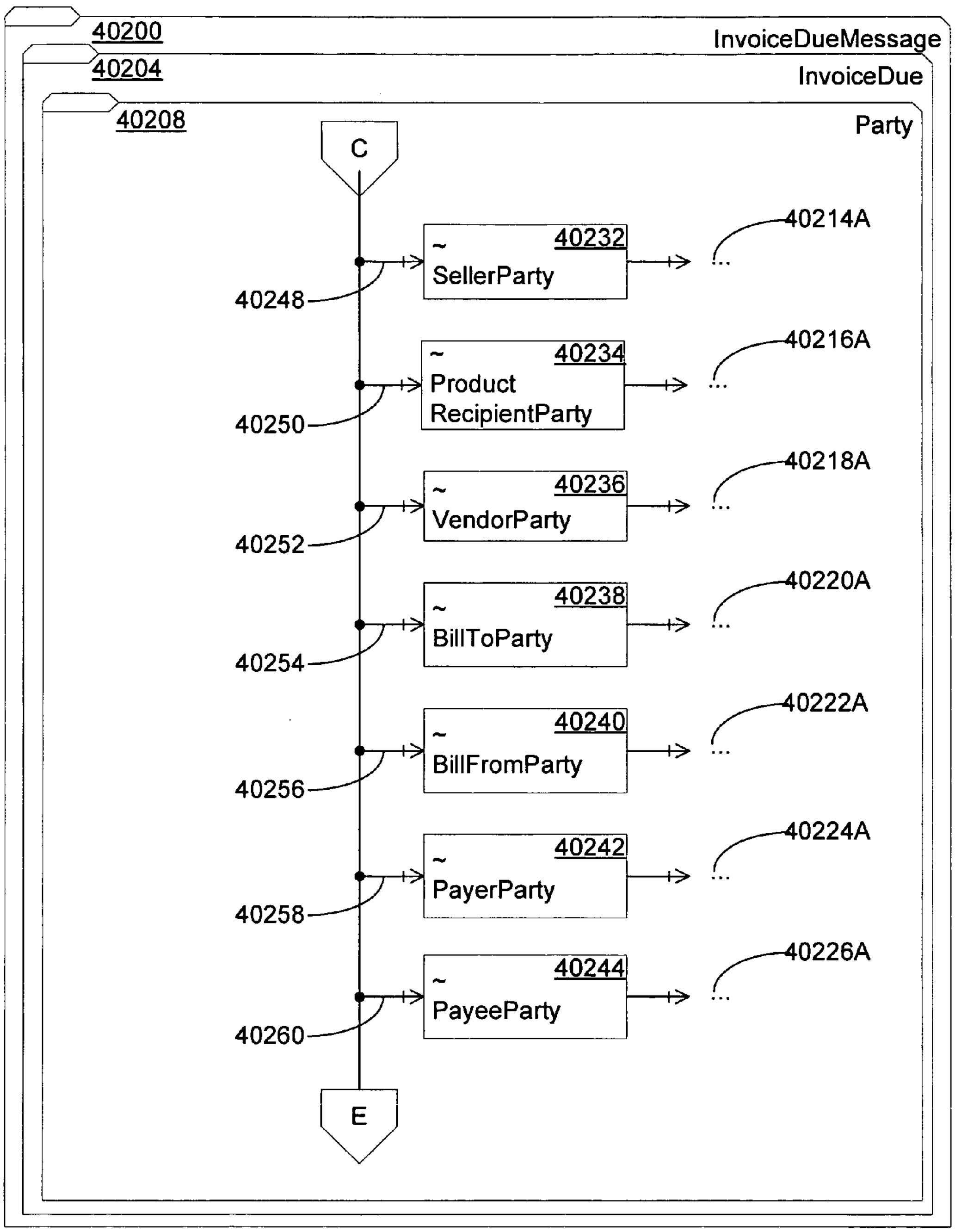
Figure 402D:
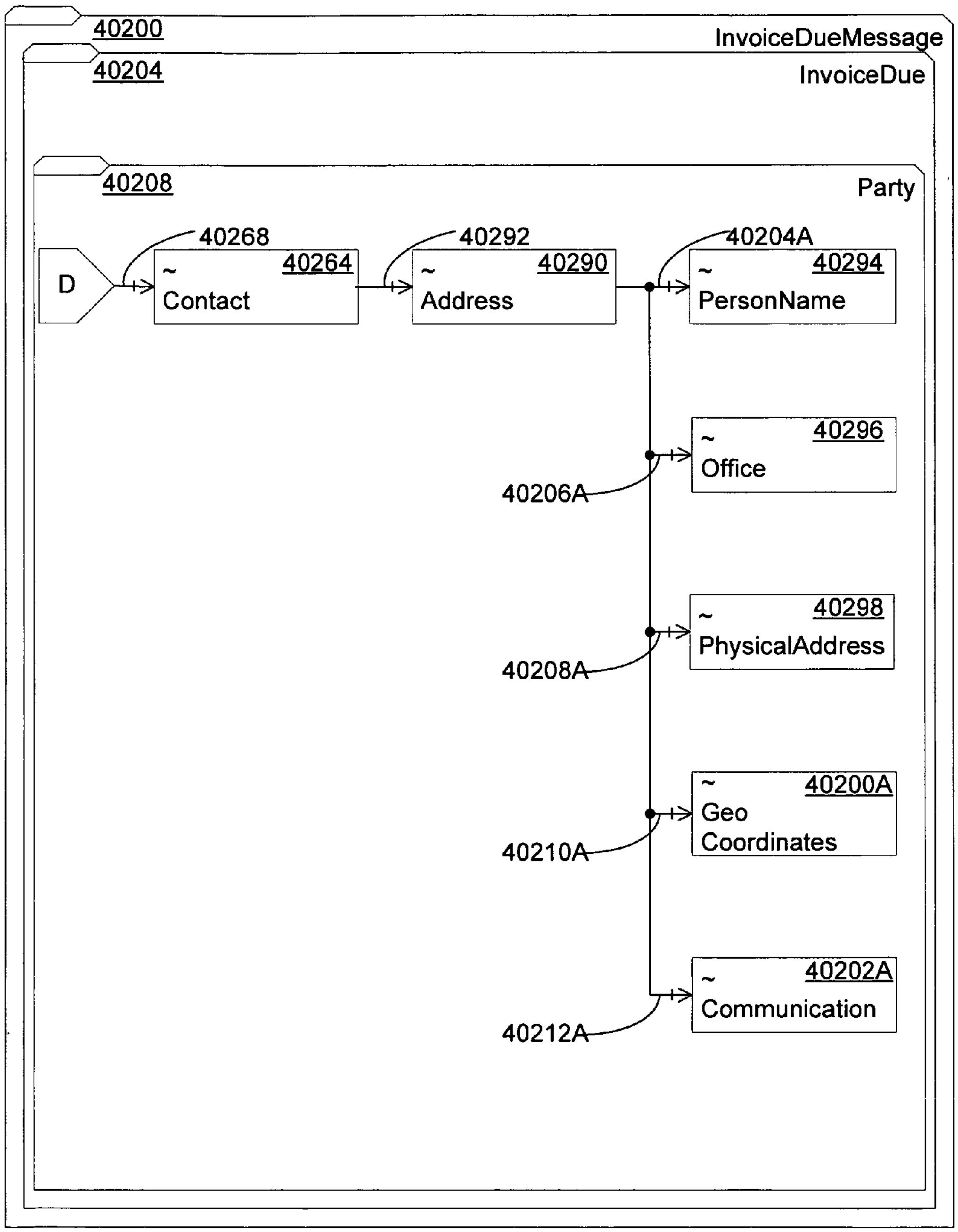
Figure 402E:
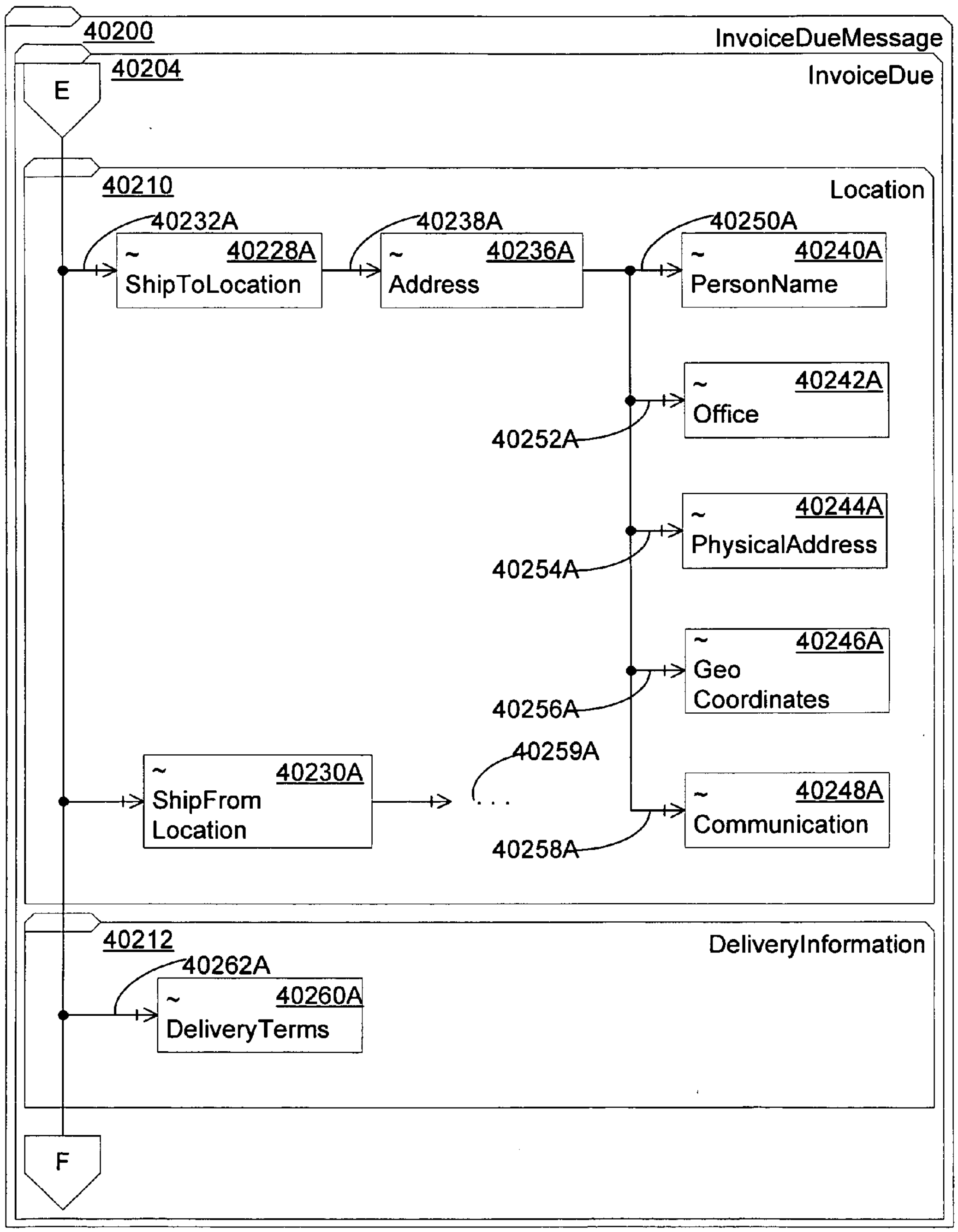
Figure 402F:
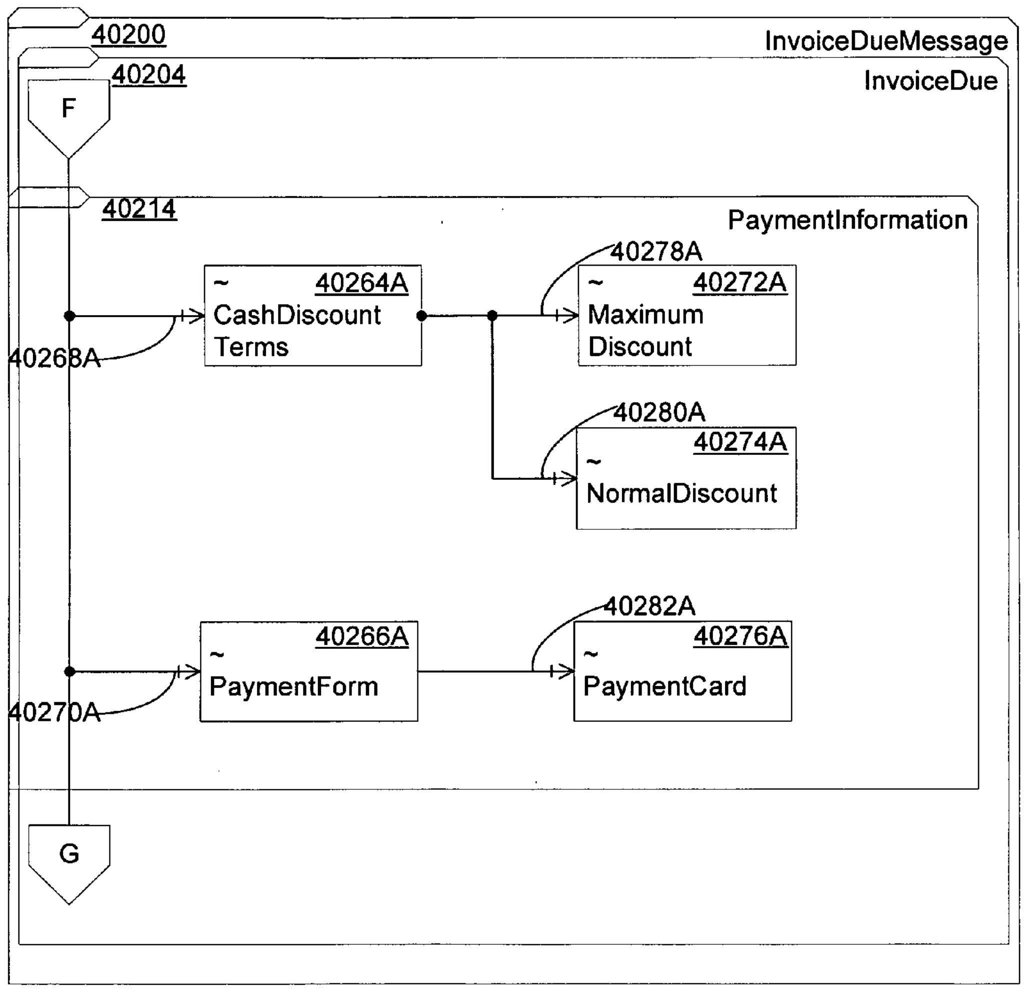
Figure 402G:
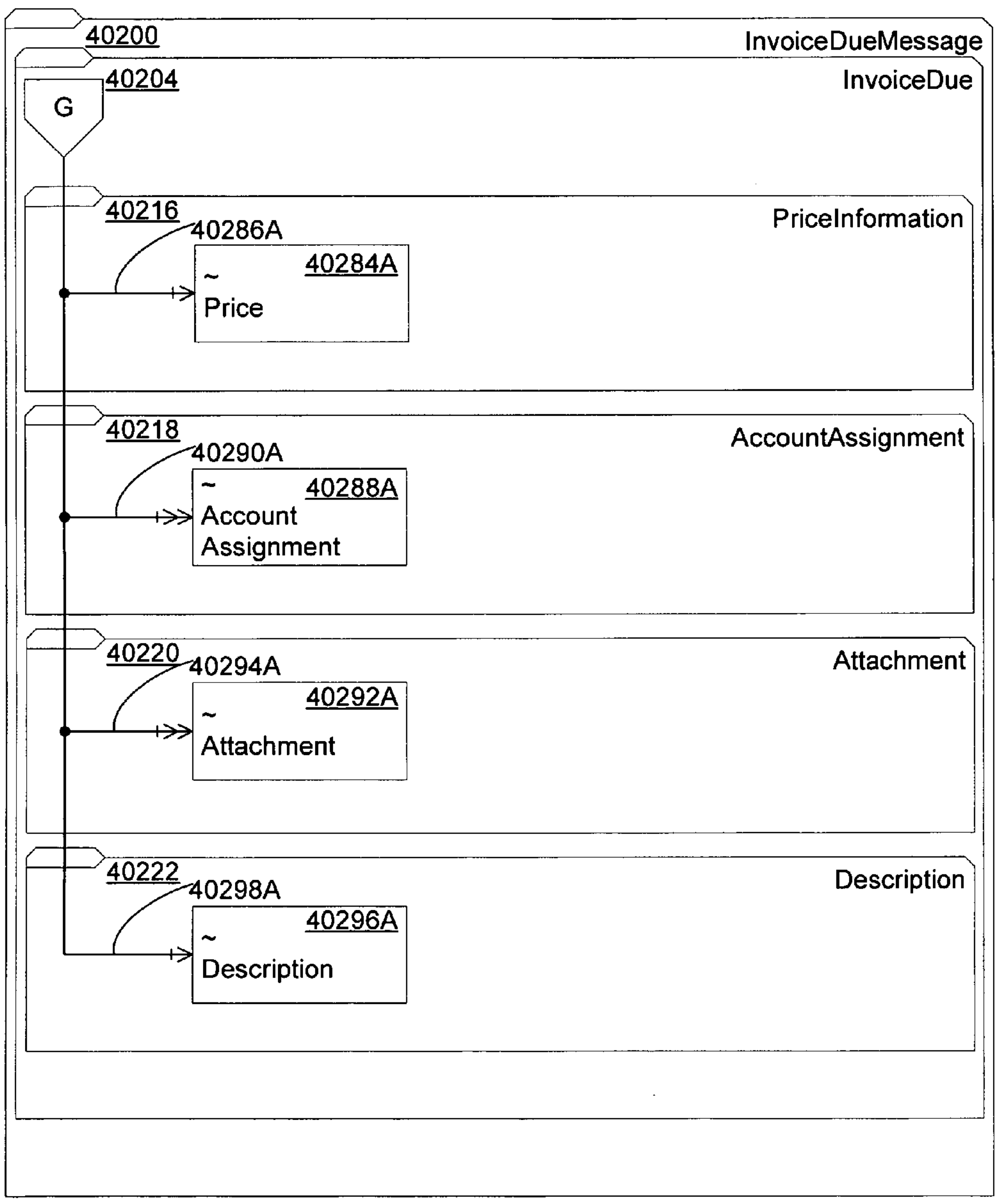
Figure 402H:
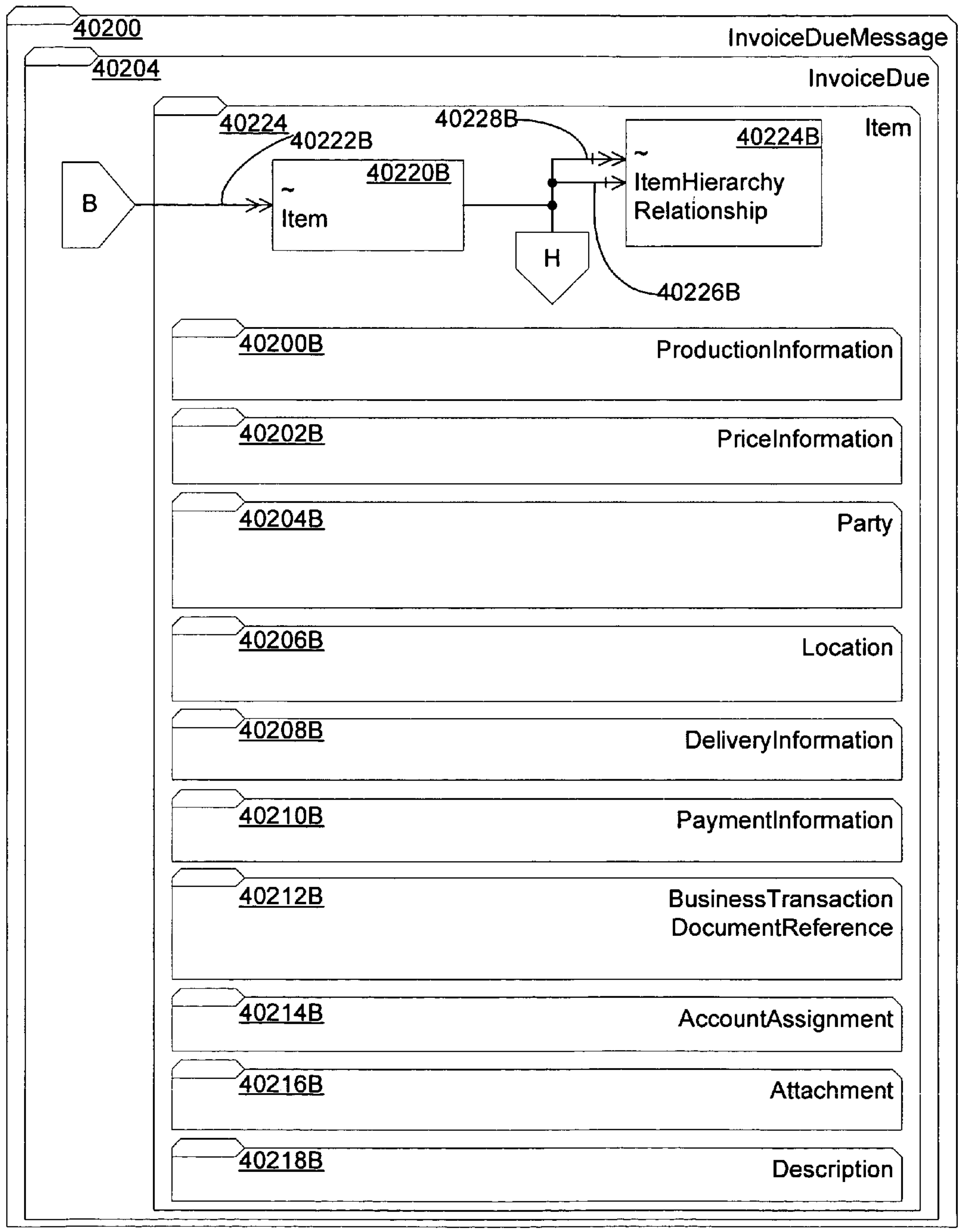
Figure 402I:
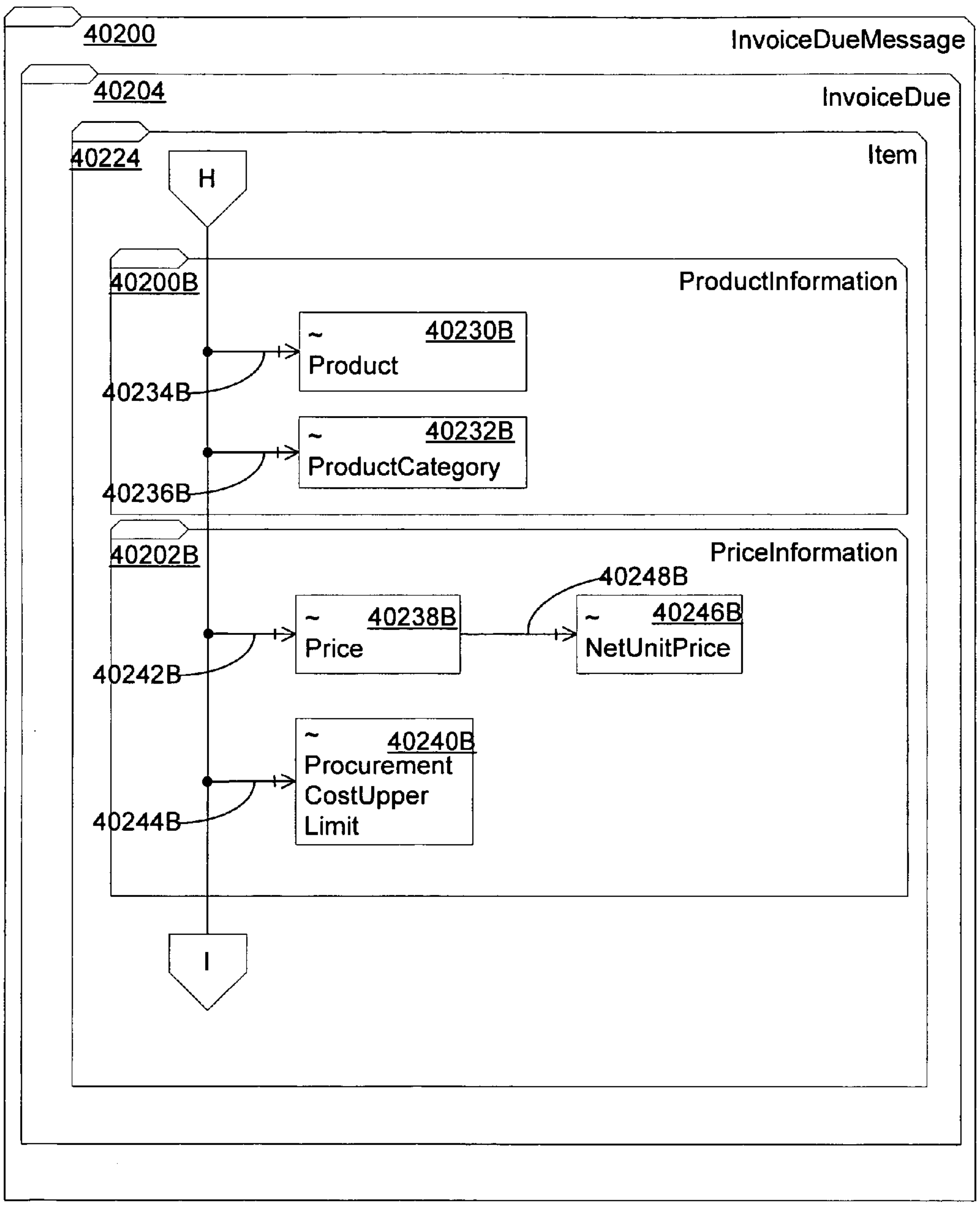
Figure 402J:
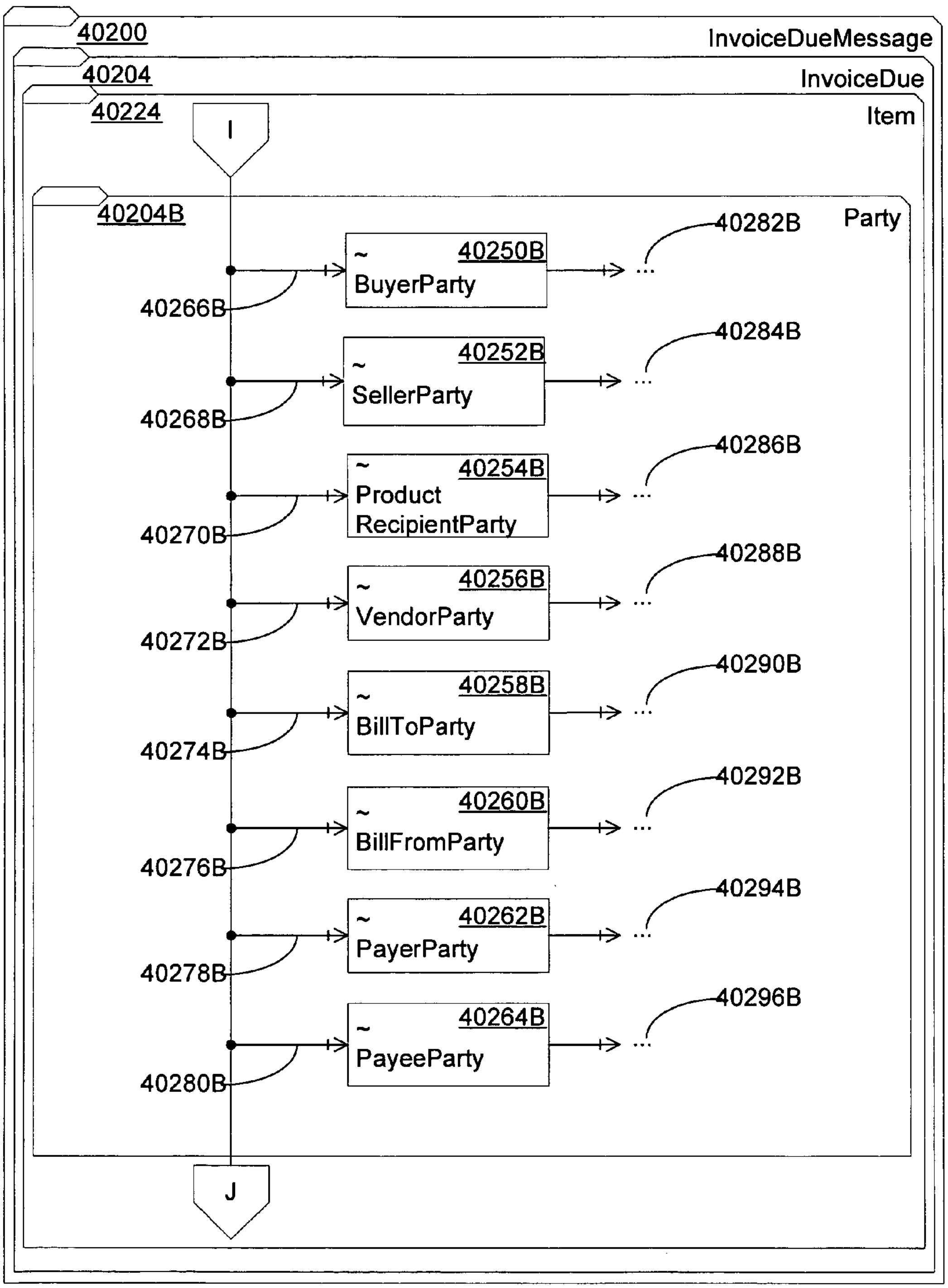
Figure 402K:
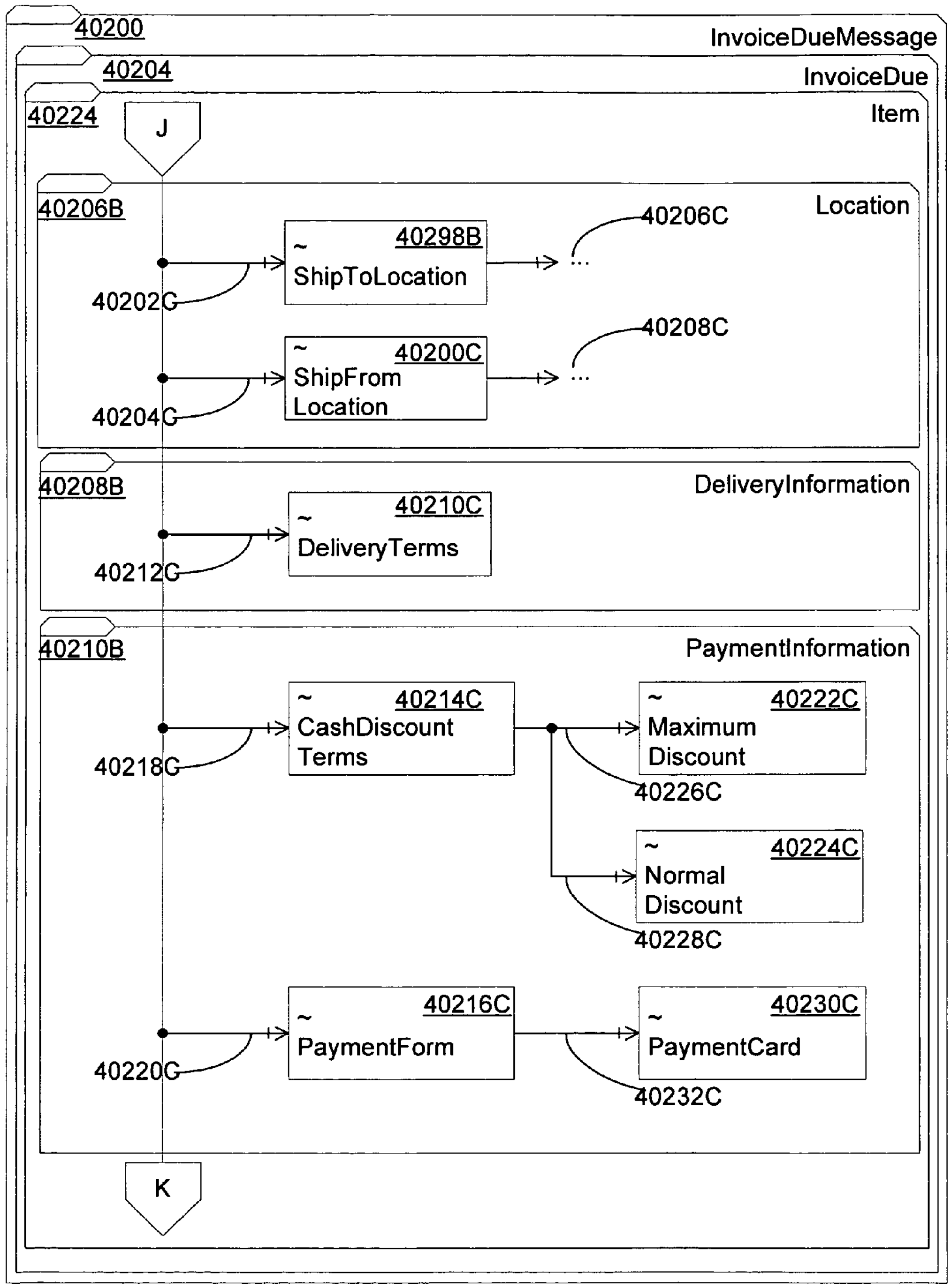
Figure 402L:
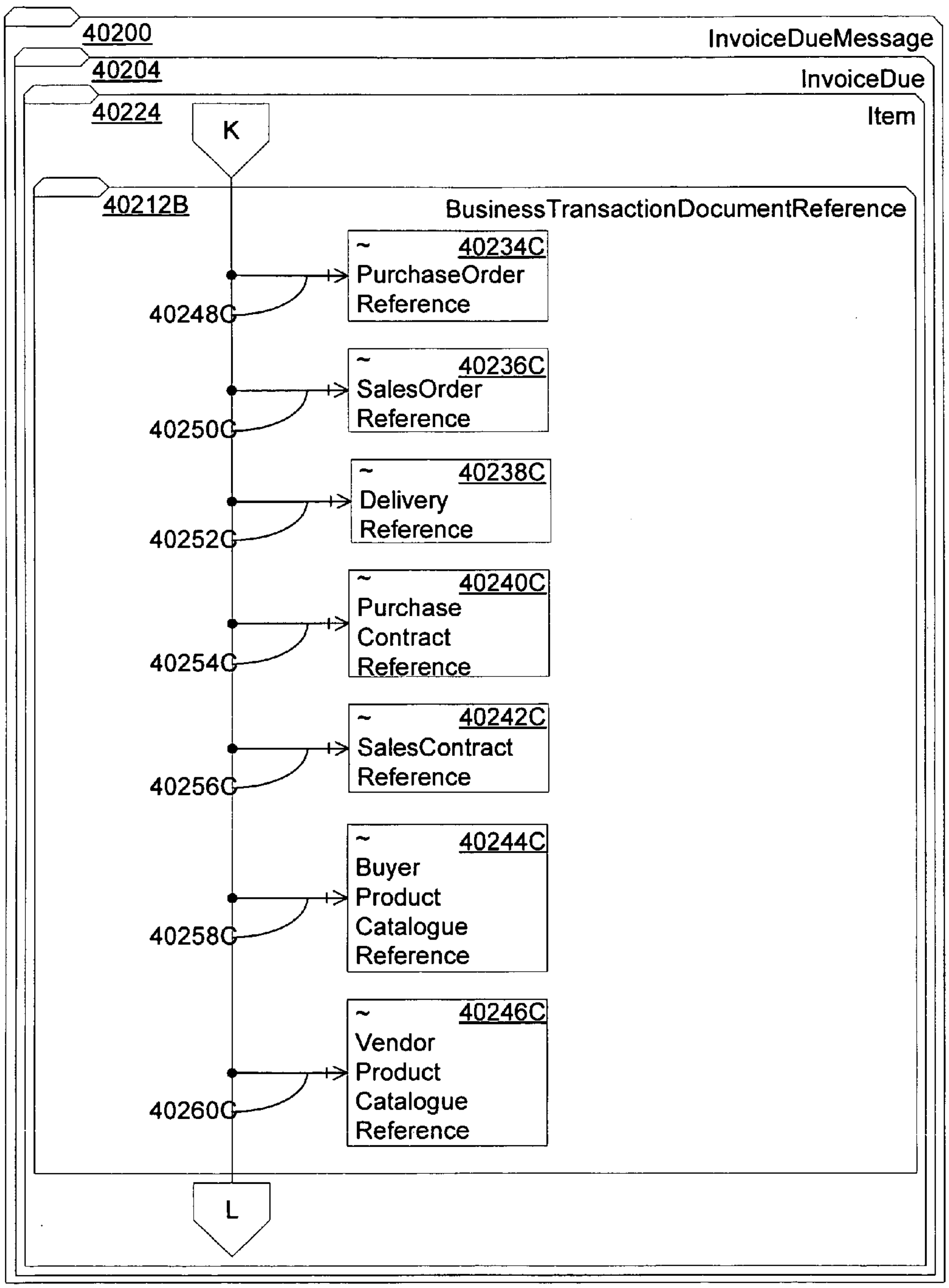
Figure 402M:
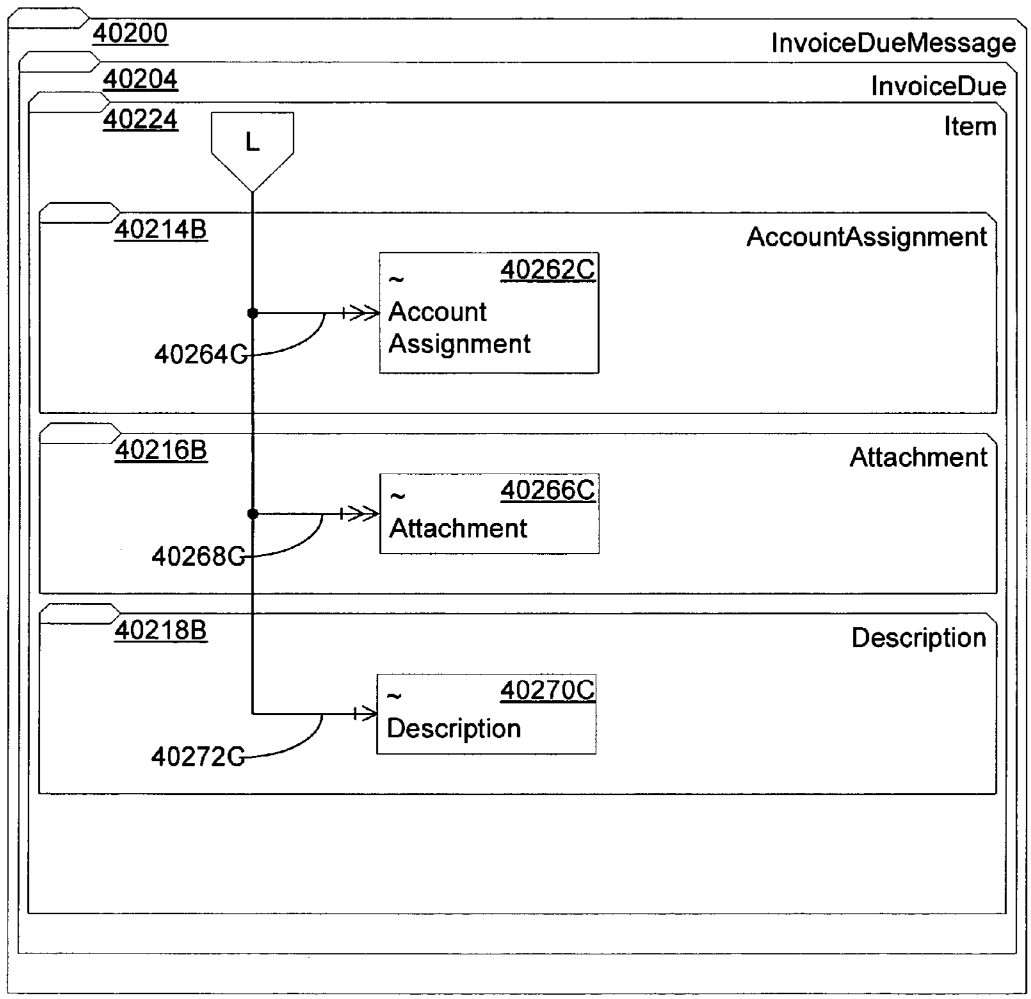
Figure 403:
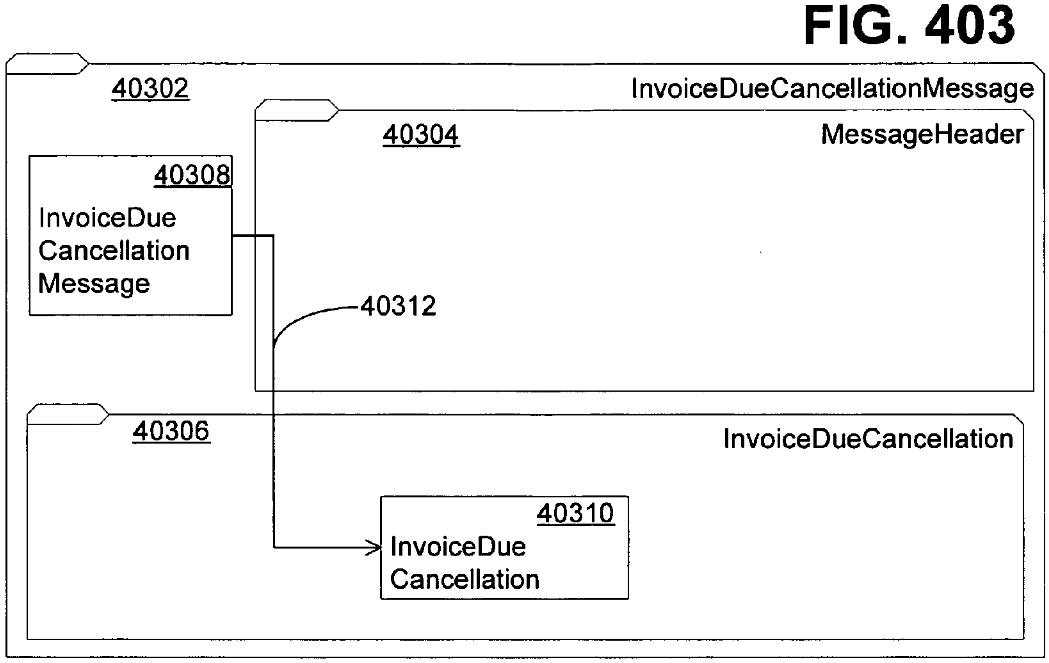
Figure 405:
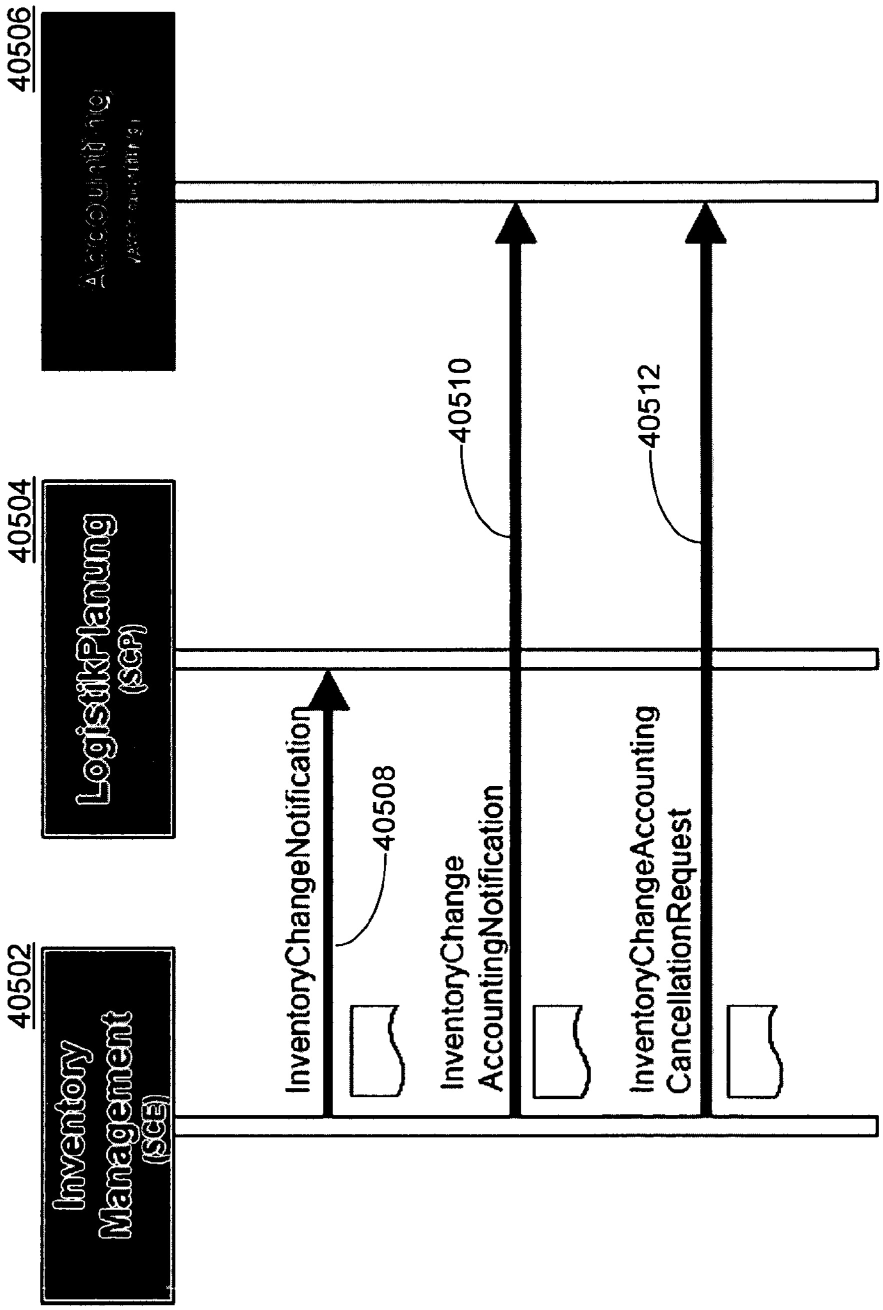
Figure 406A:
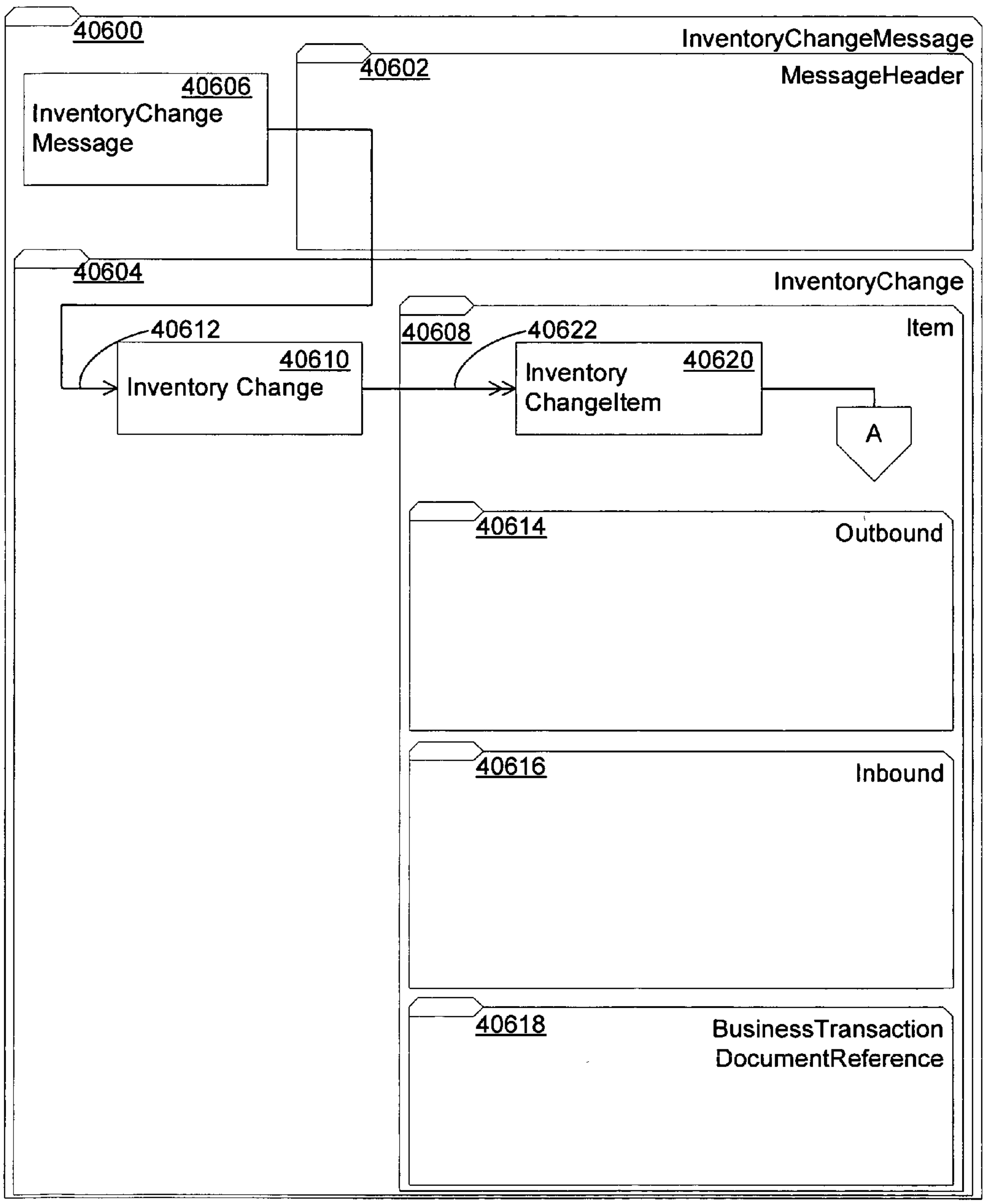
Figure 406B:
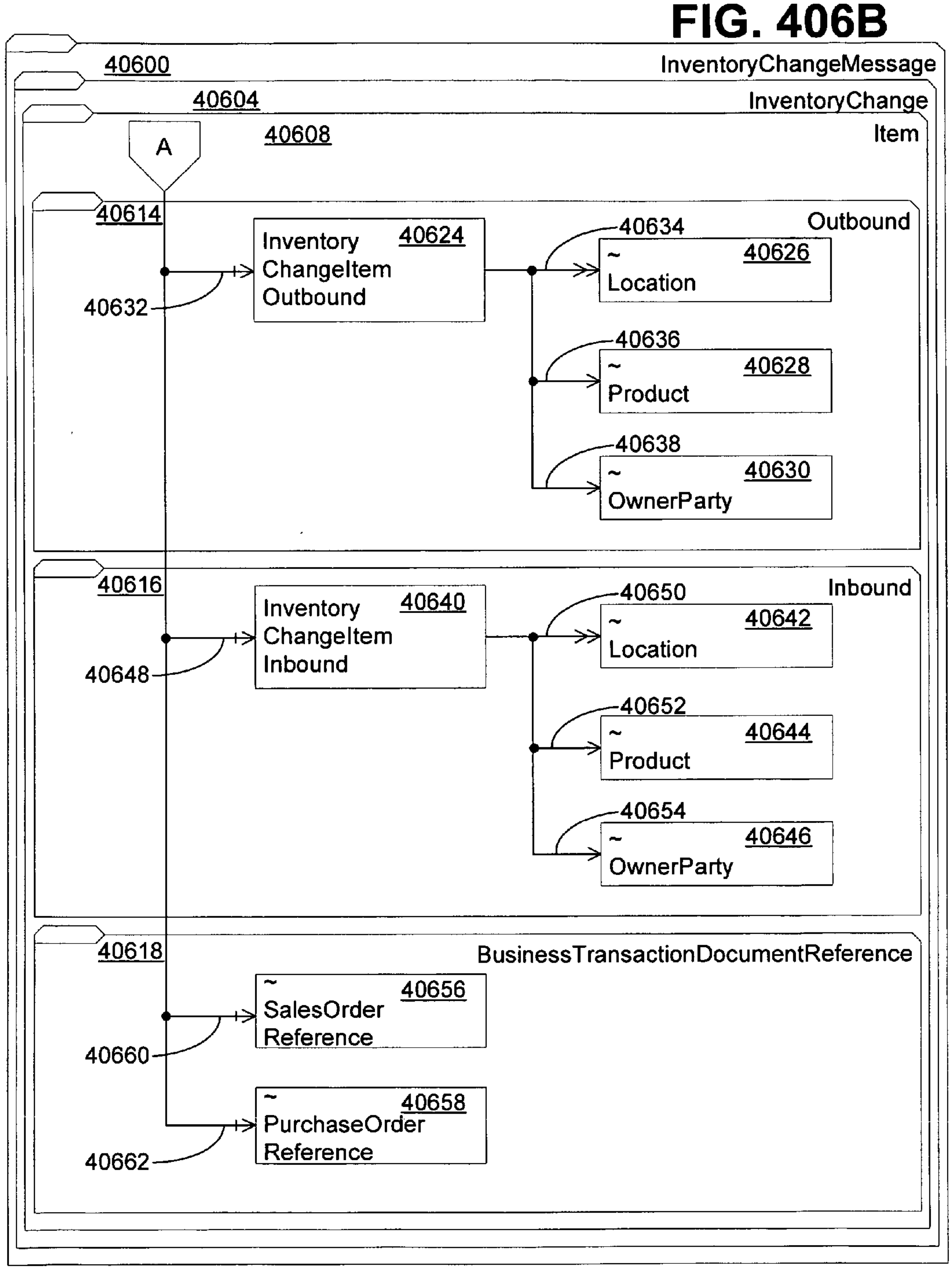
Figure 408:
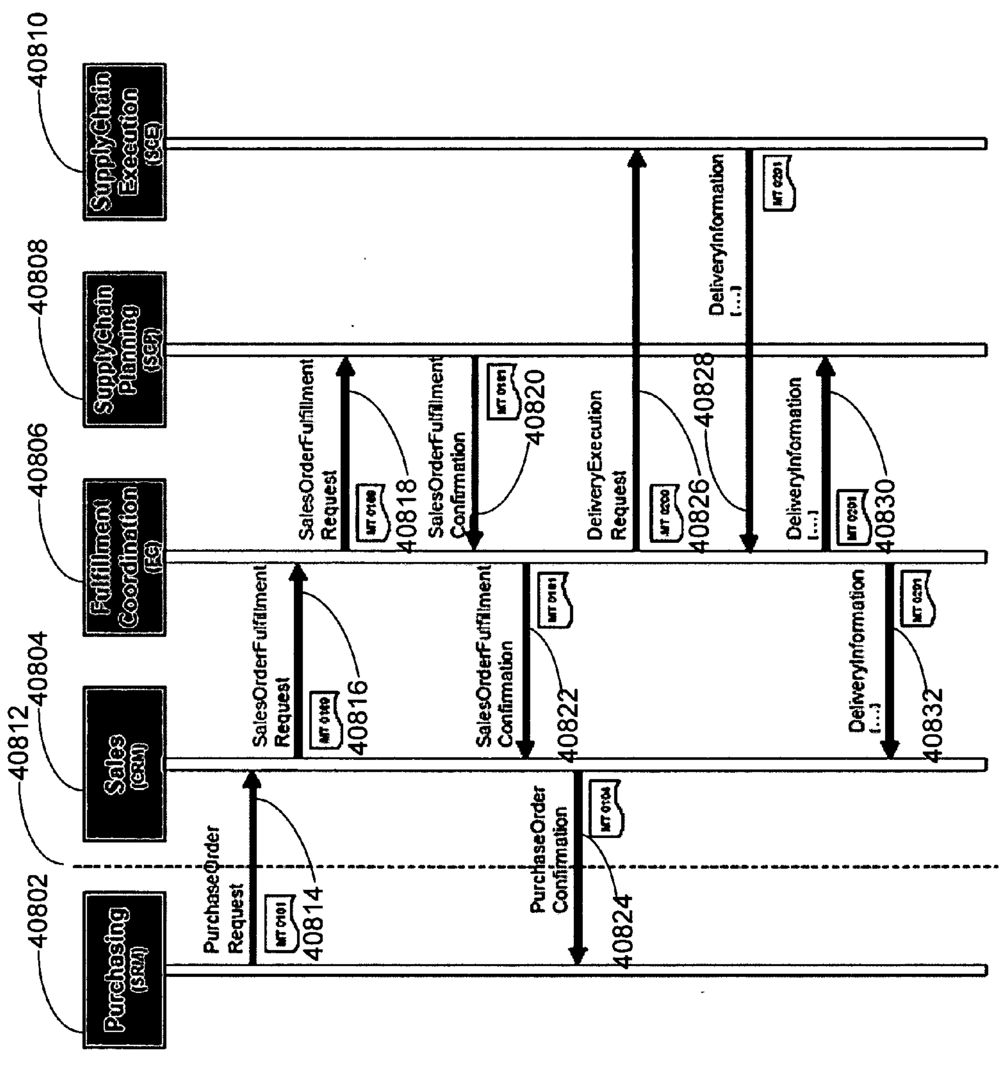
Figure 411:
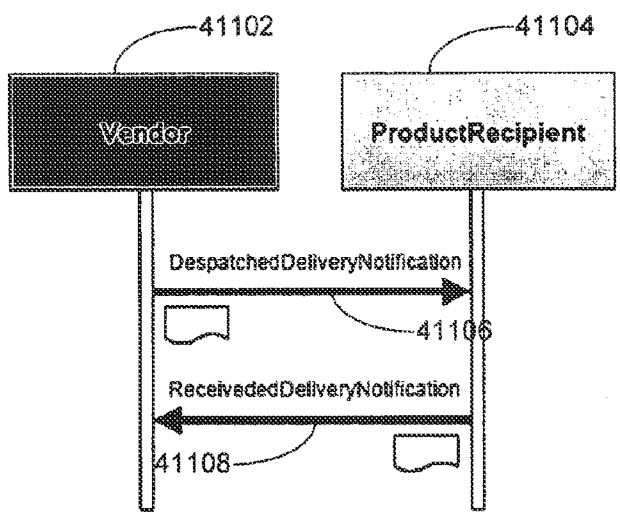
Figure 412A:
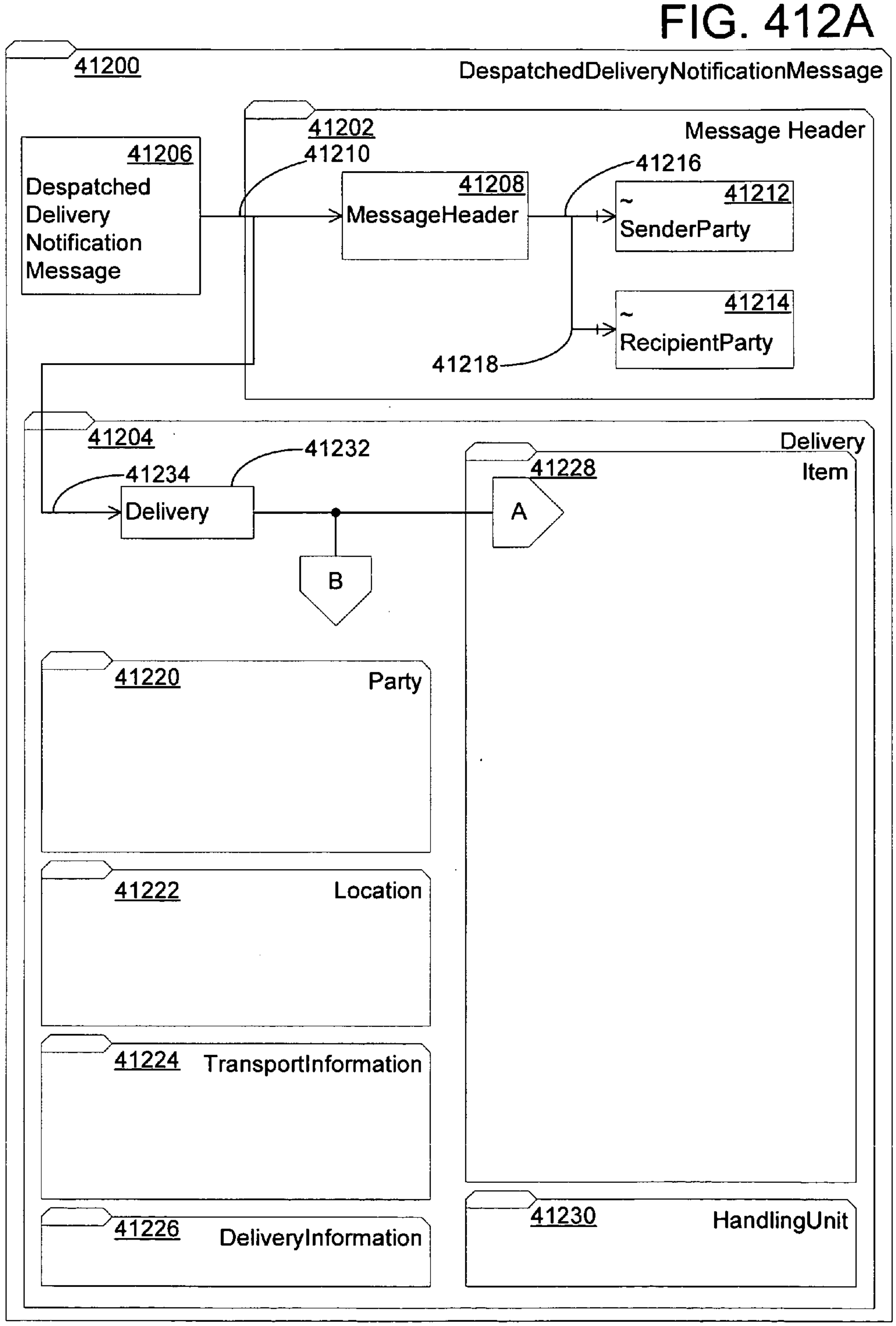
Figure 412B:
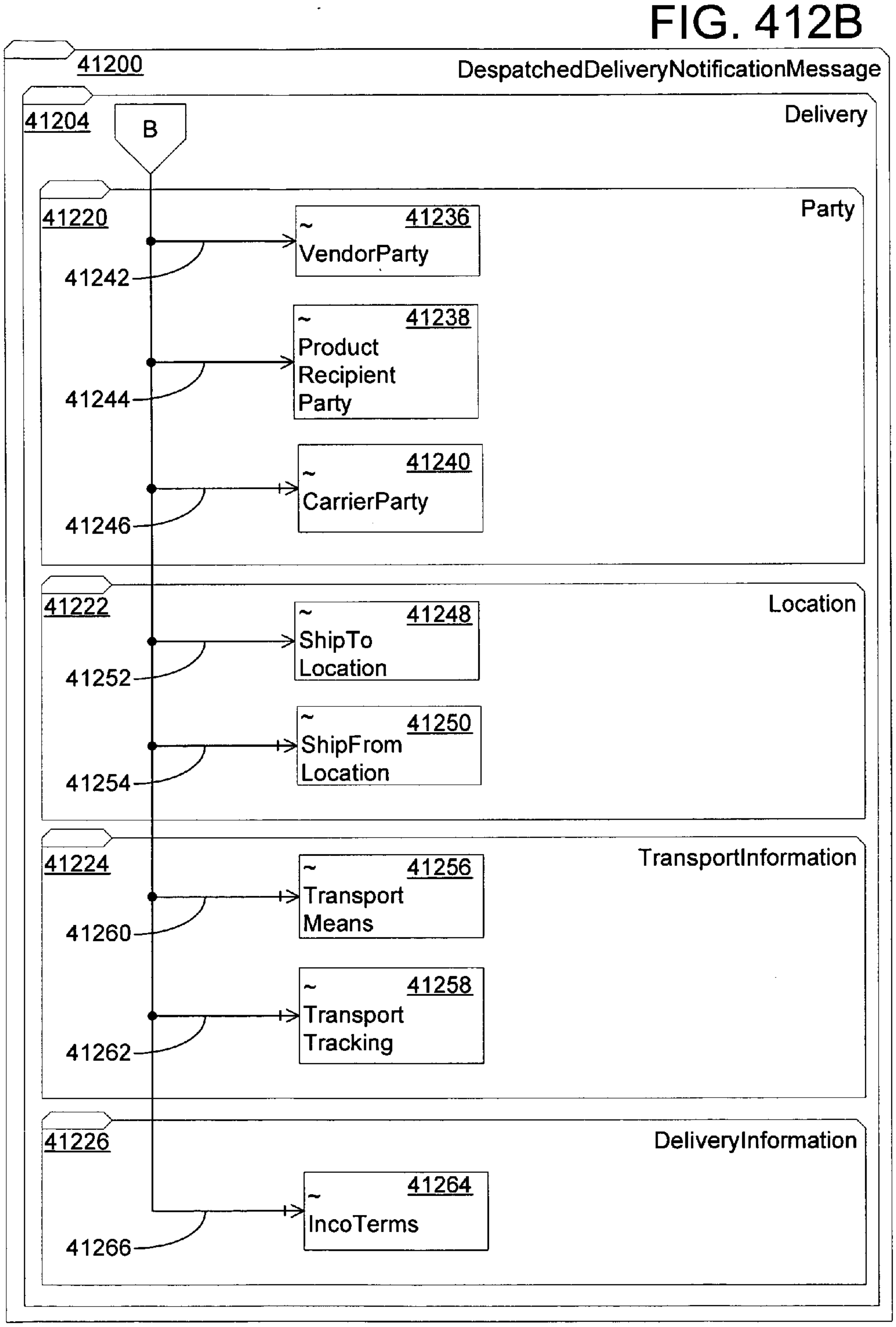
Figure 412C:
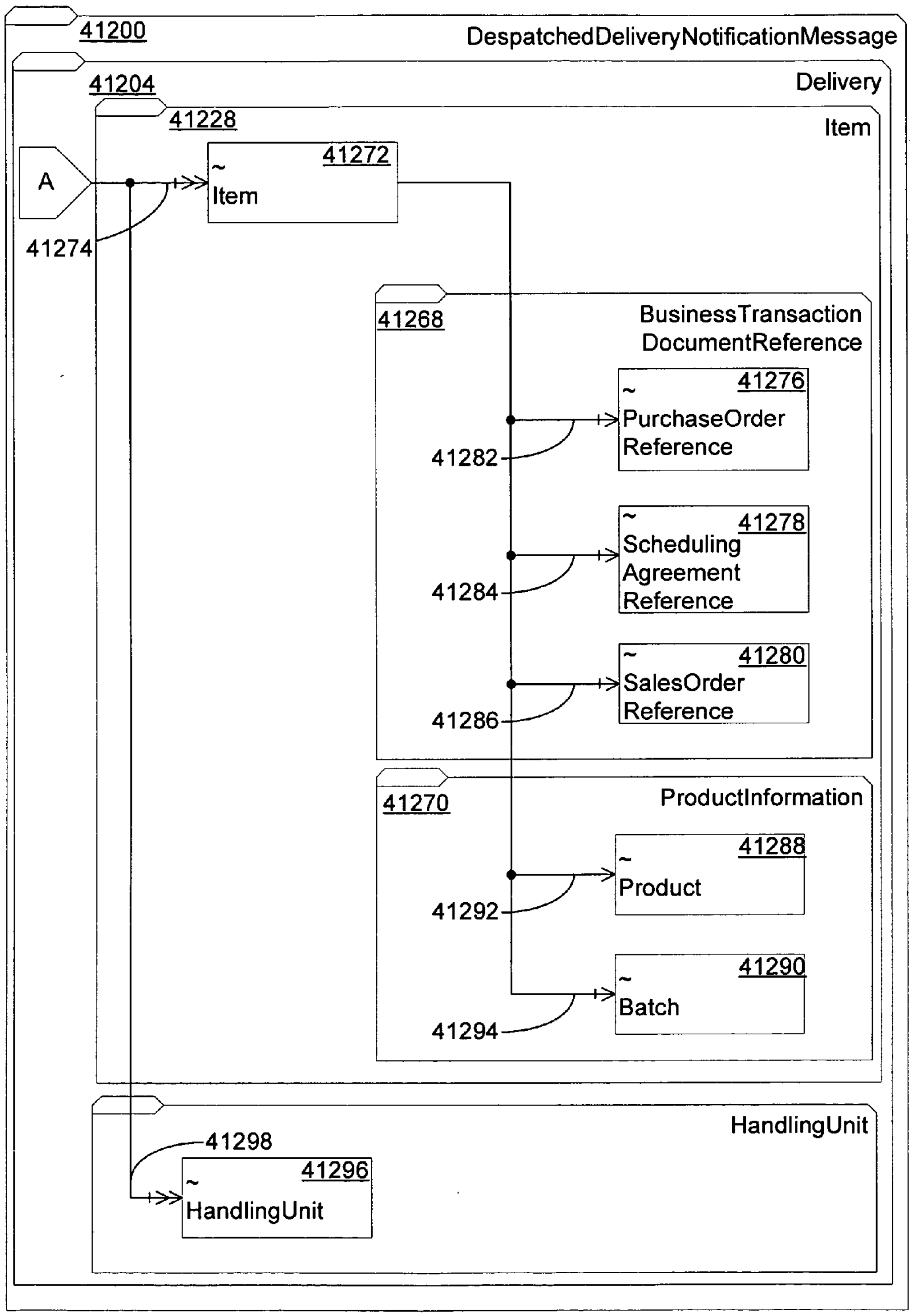
Figure 413:
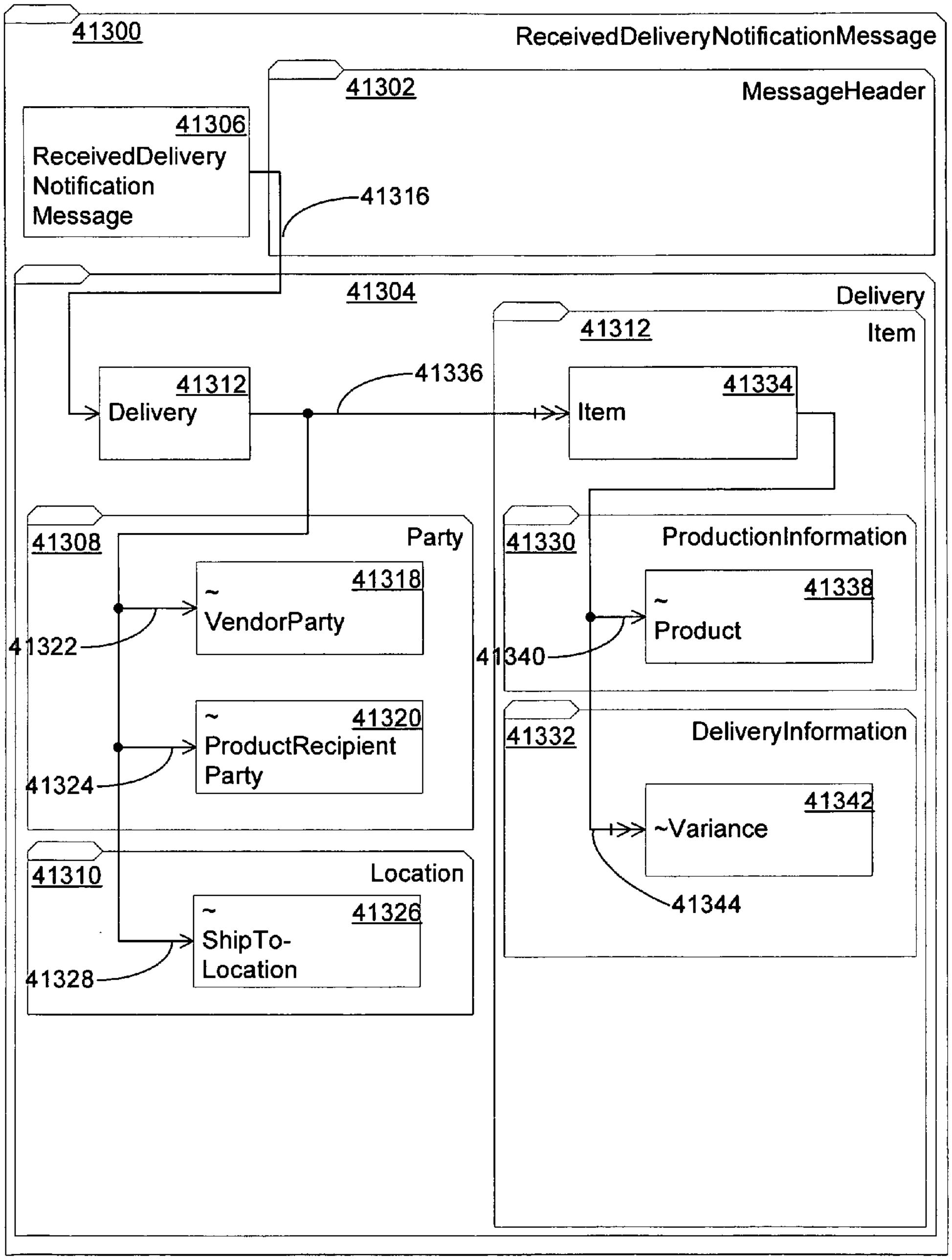
Figure 414G:
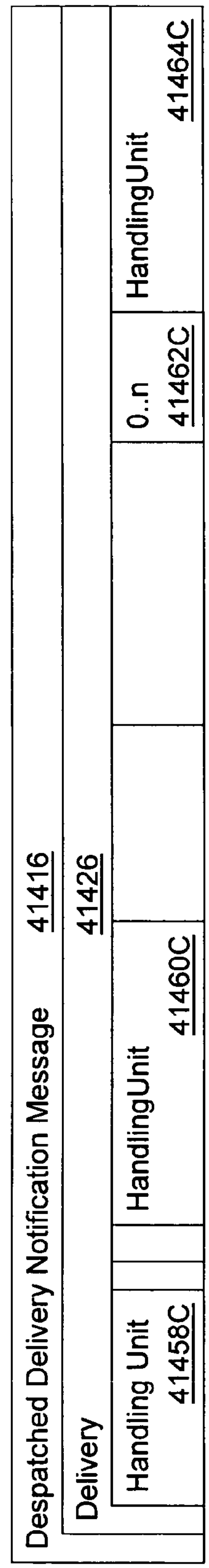
Figure 416:
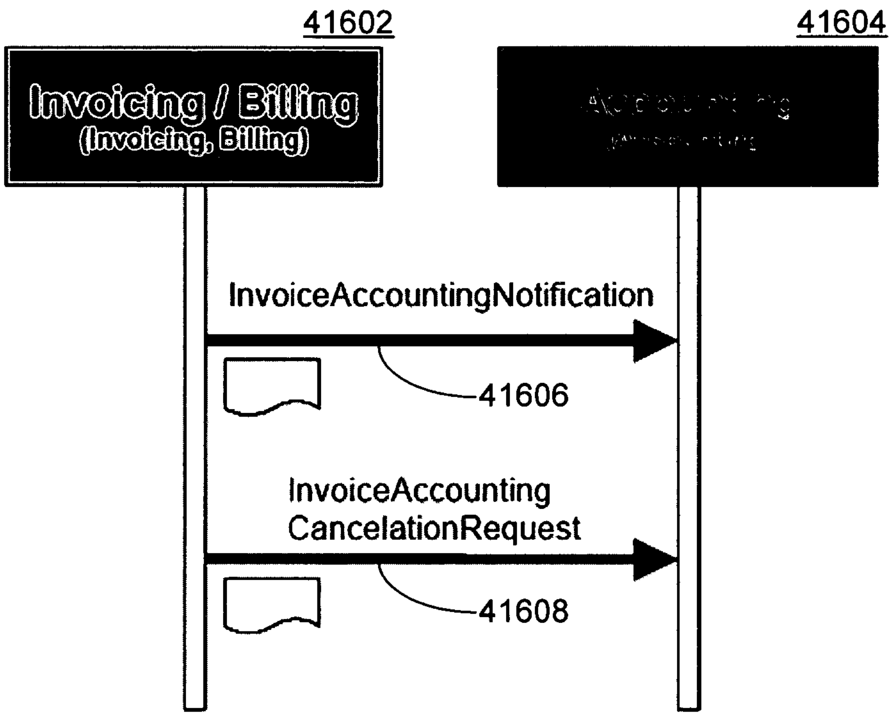
Figure 417A:
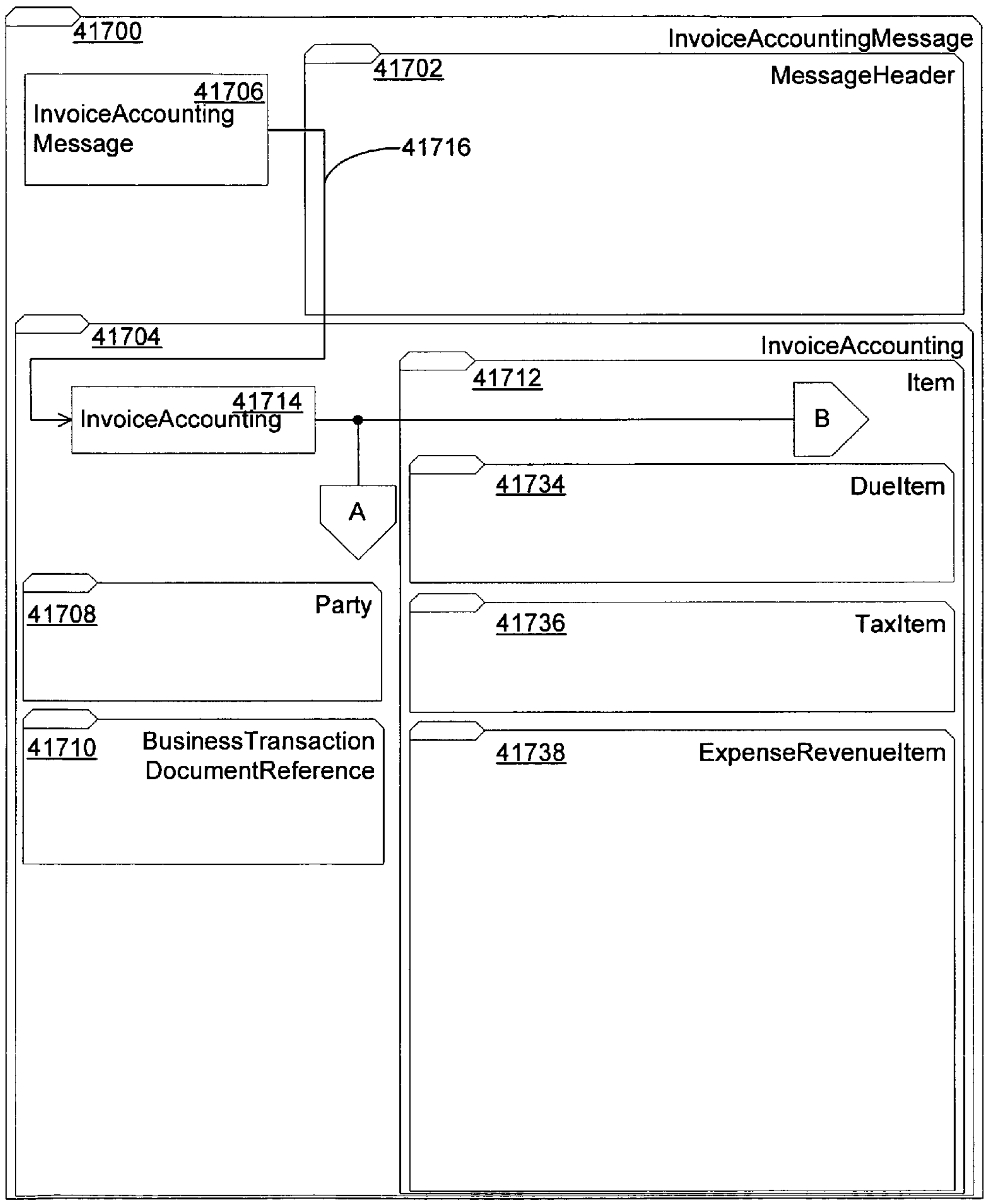
Figure 417B:
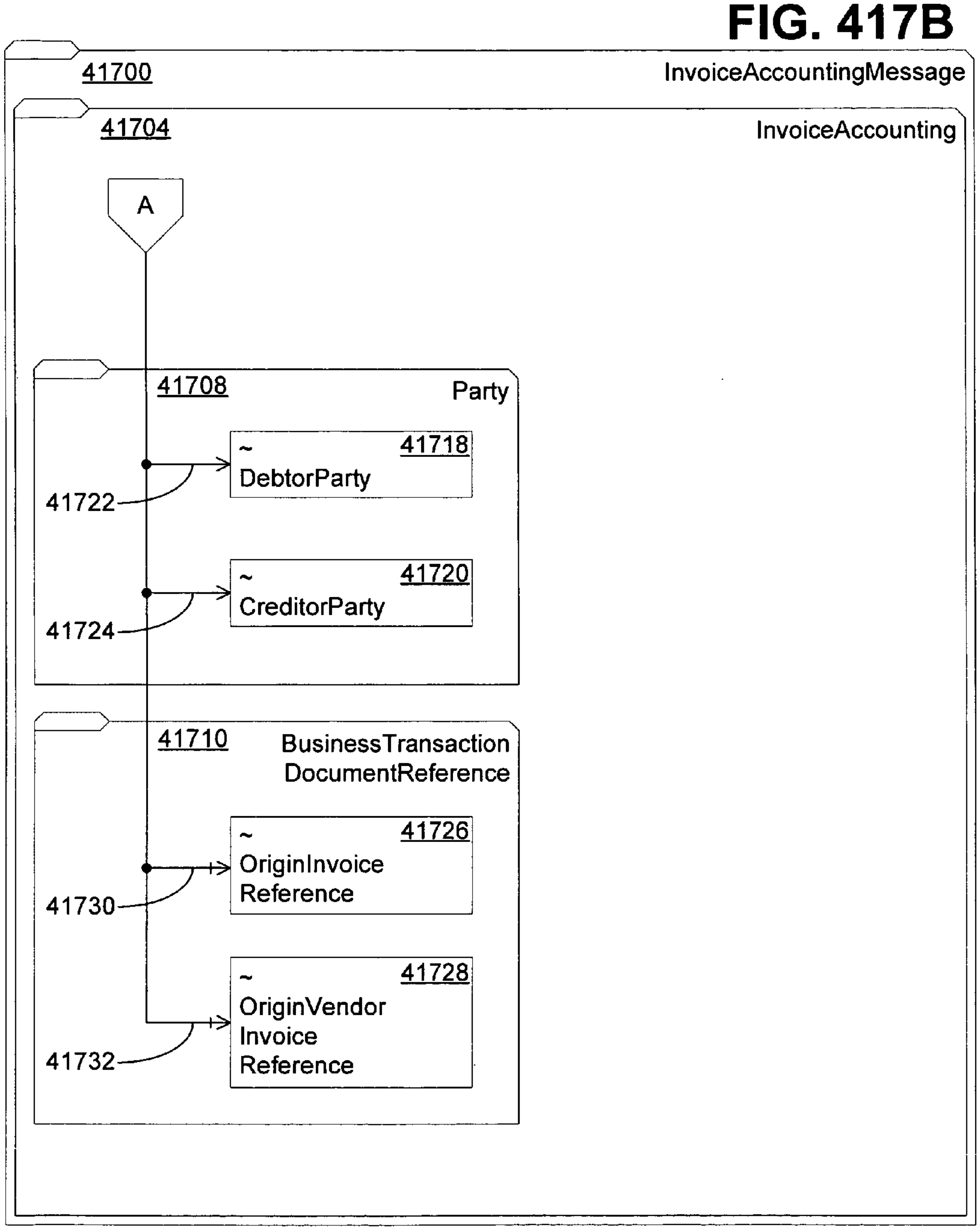
Figure 417C:
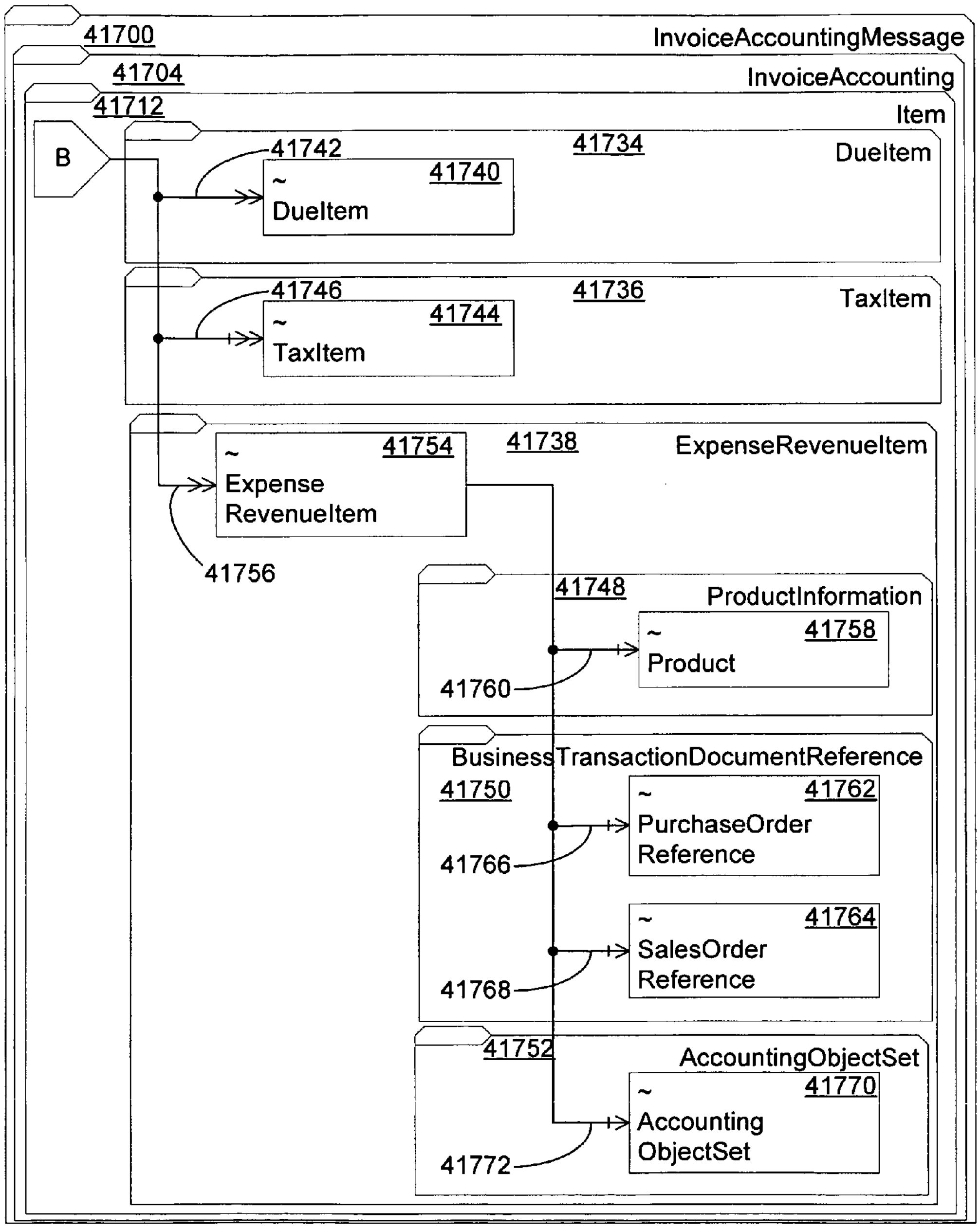
Figure 419:
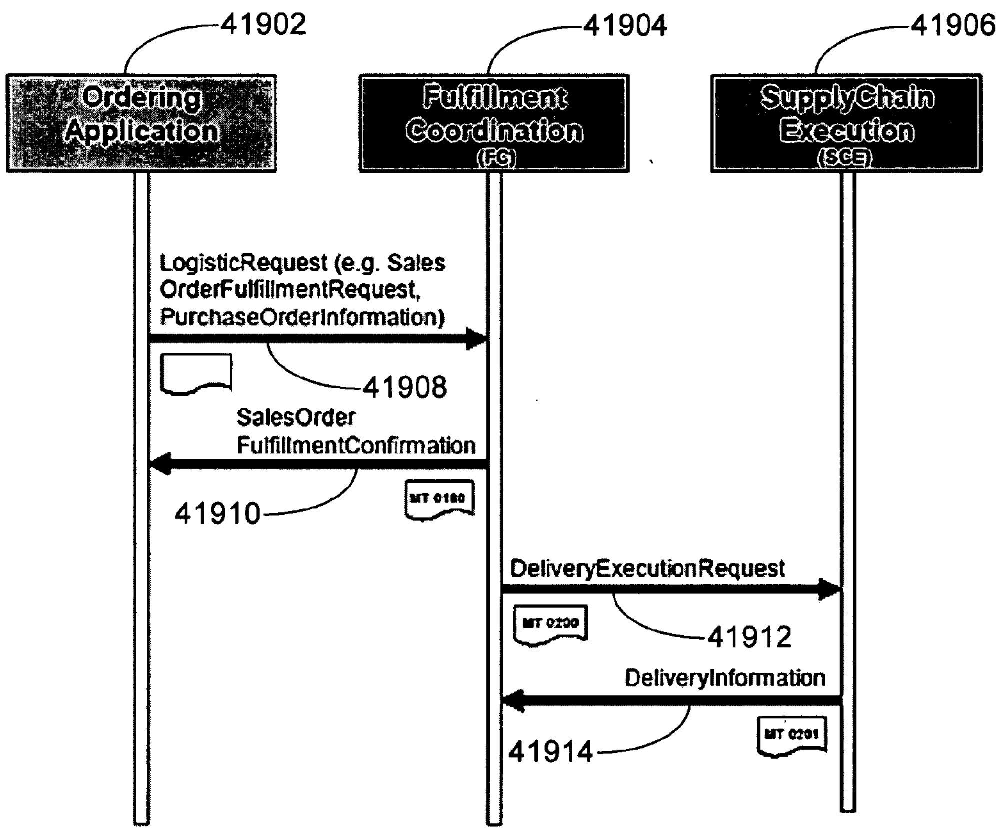
Figure 420A:
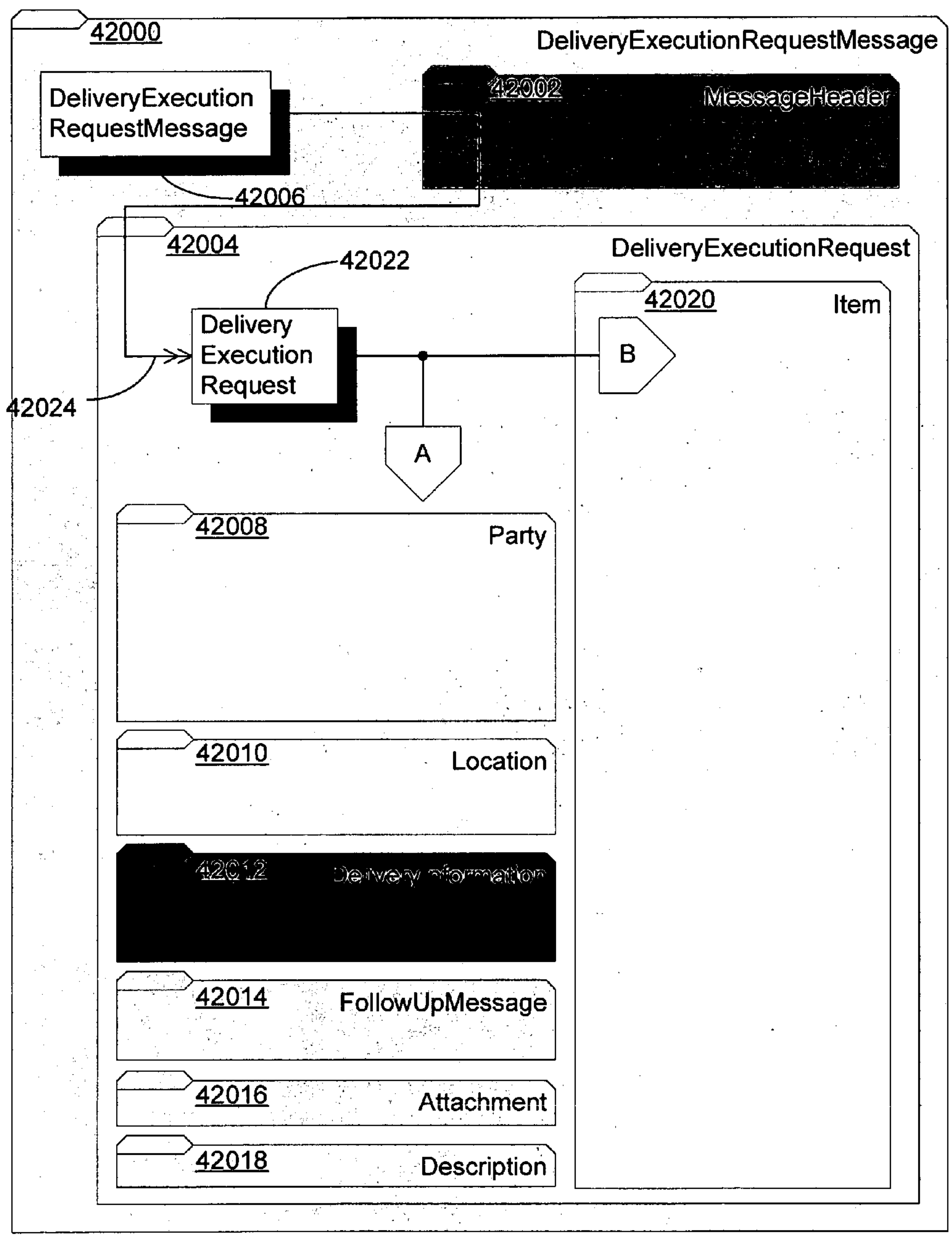
Figure 420B:
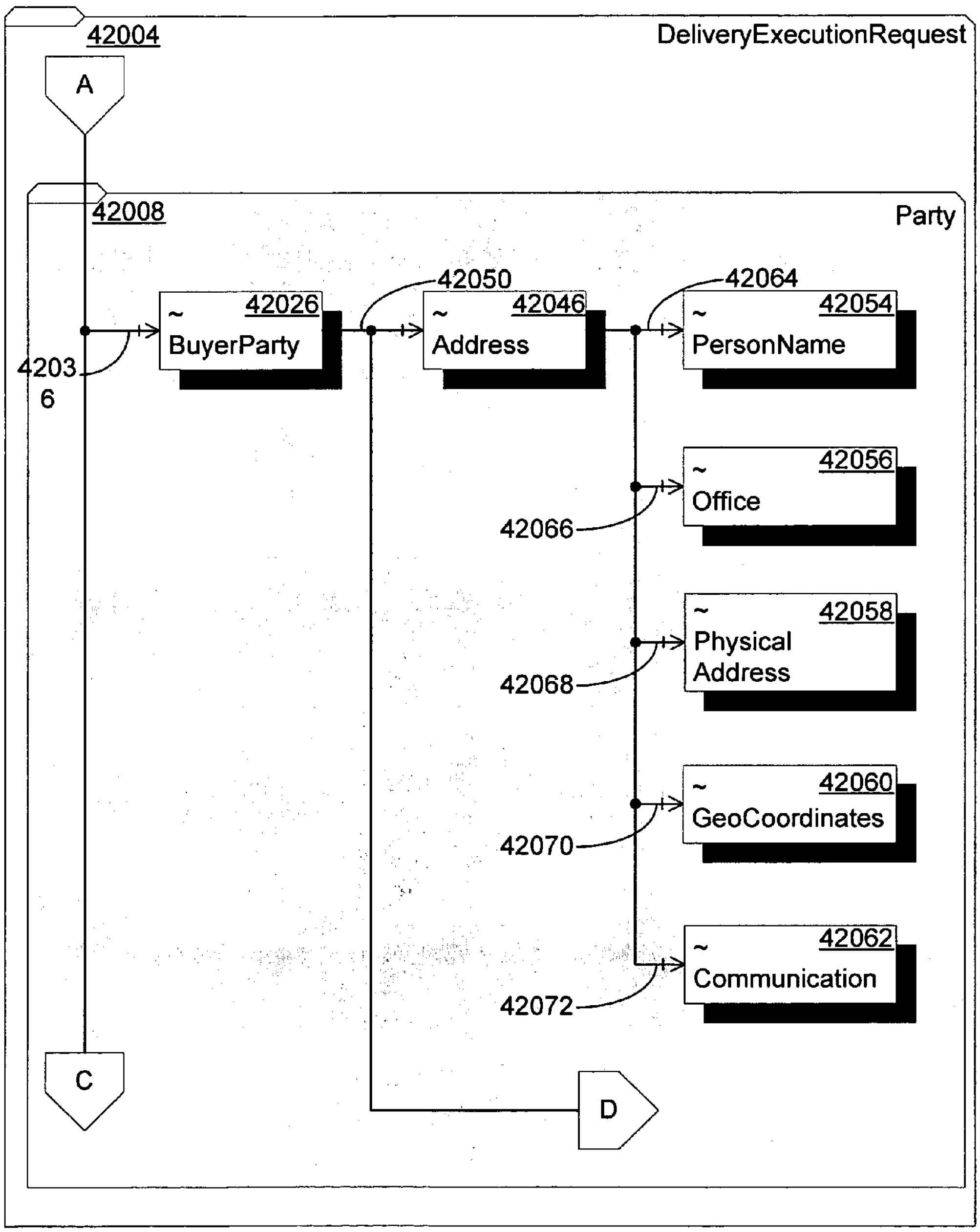
Figure 420C:
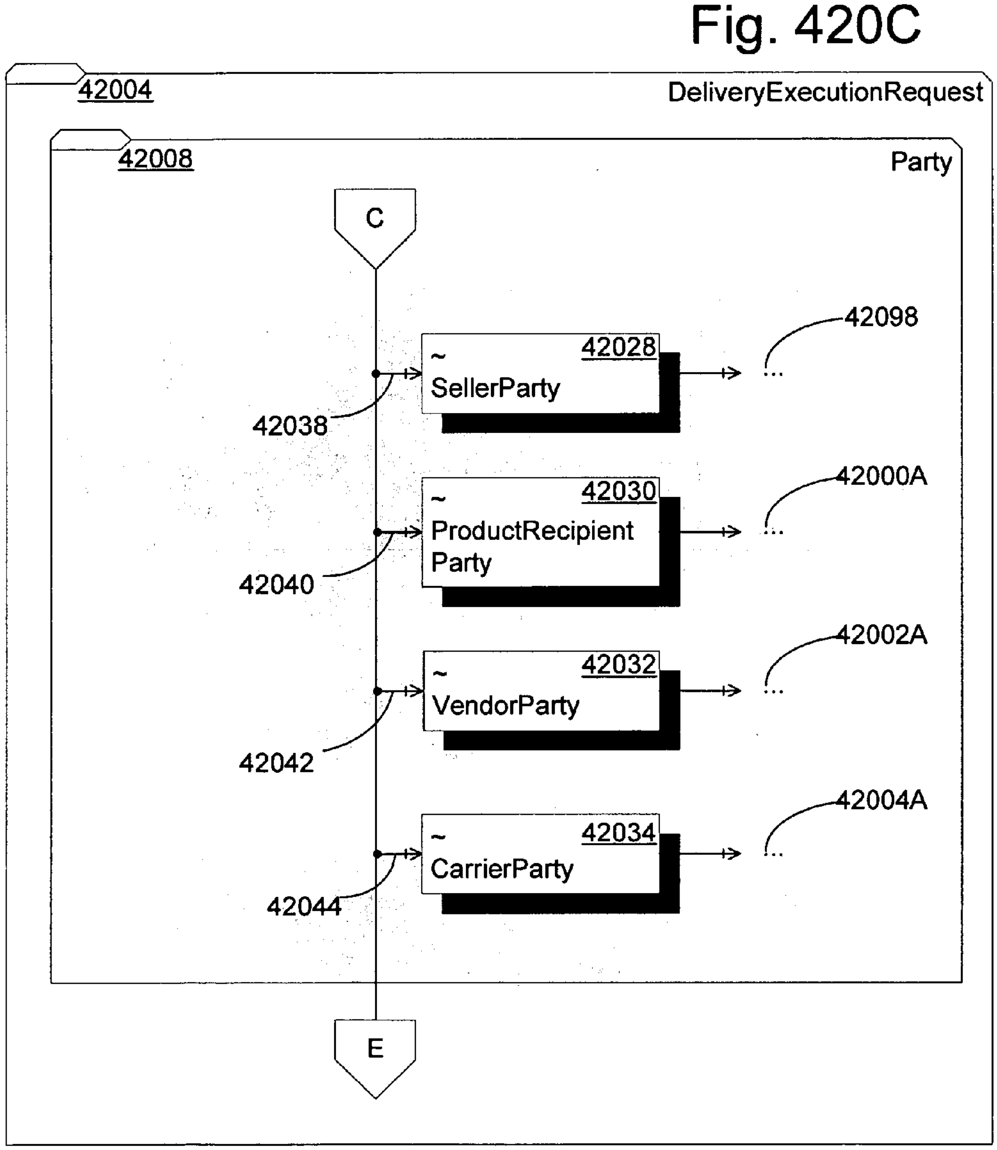
Figure 420D:
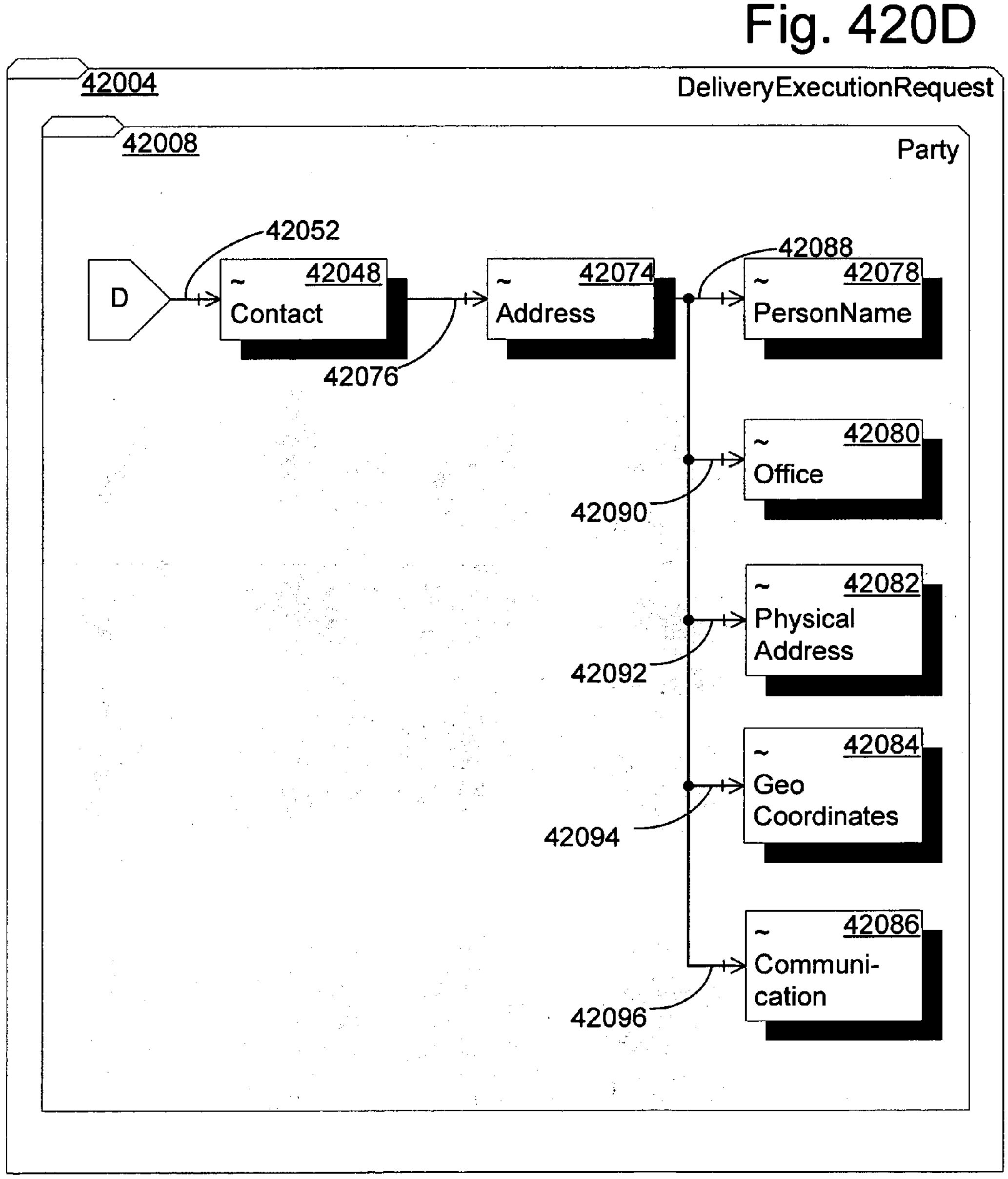
Figure 420E:
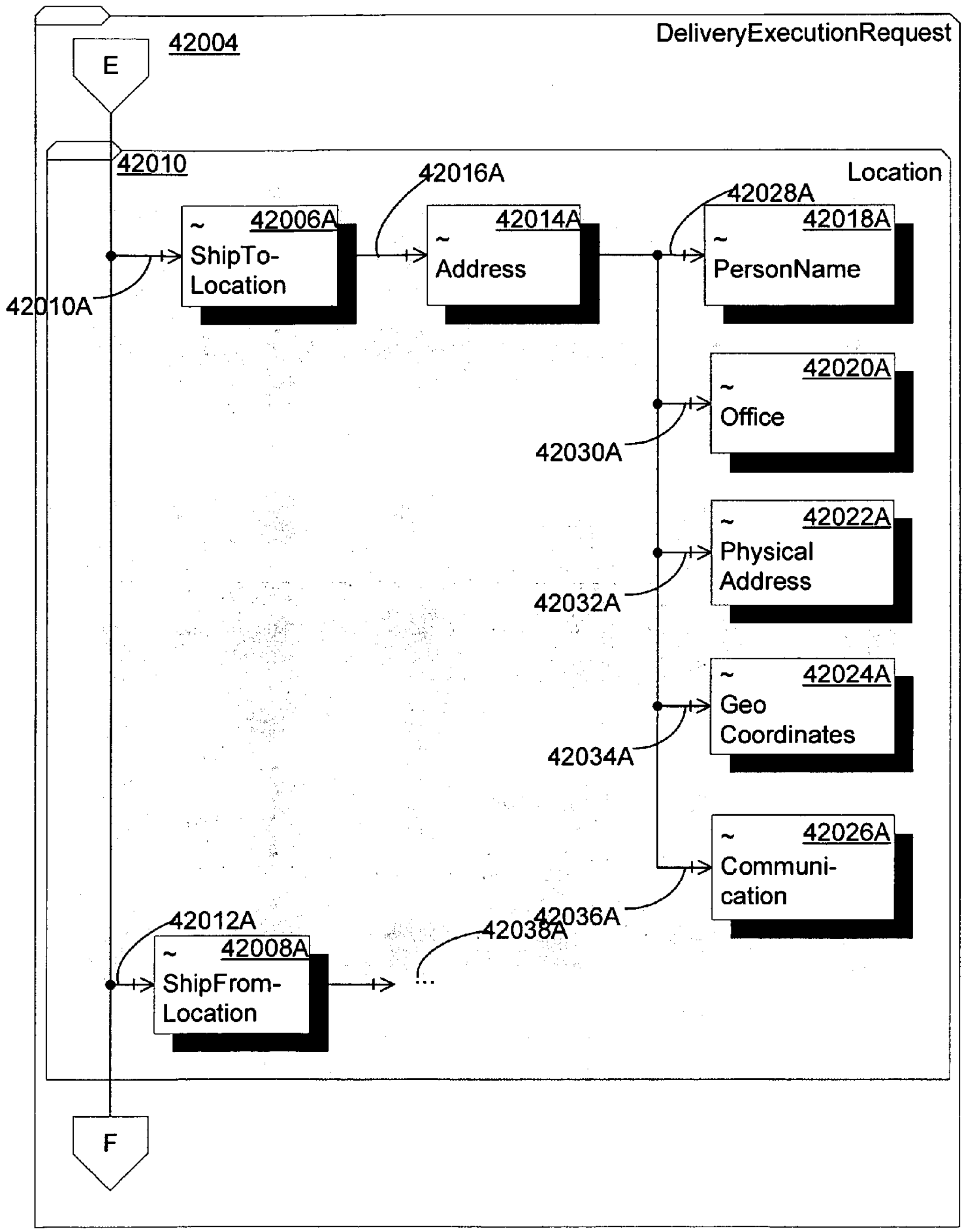
Figure 420F:
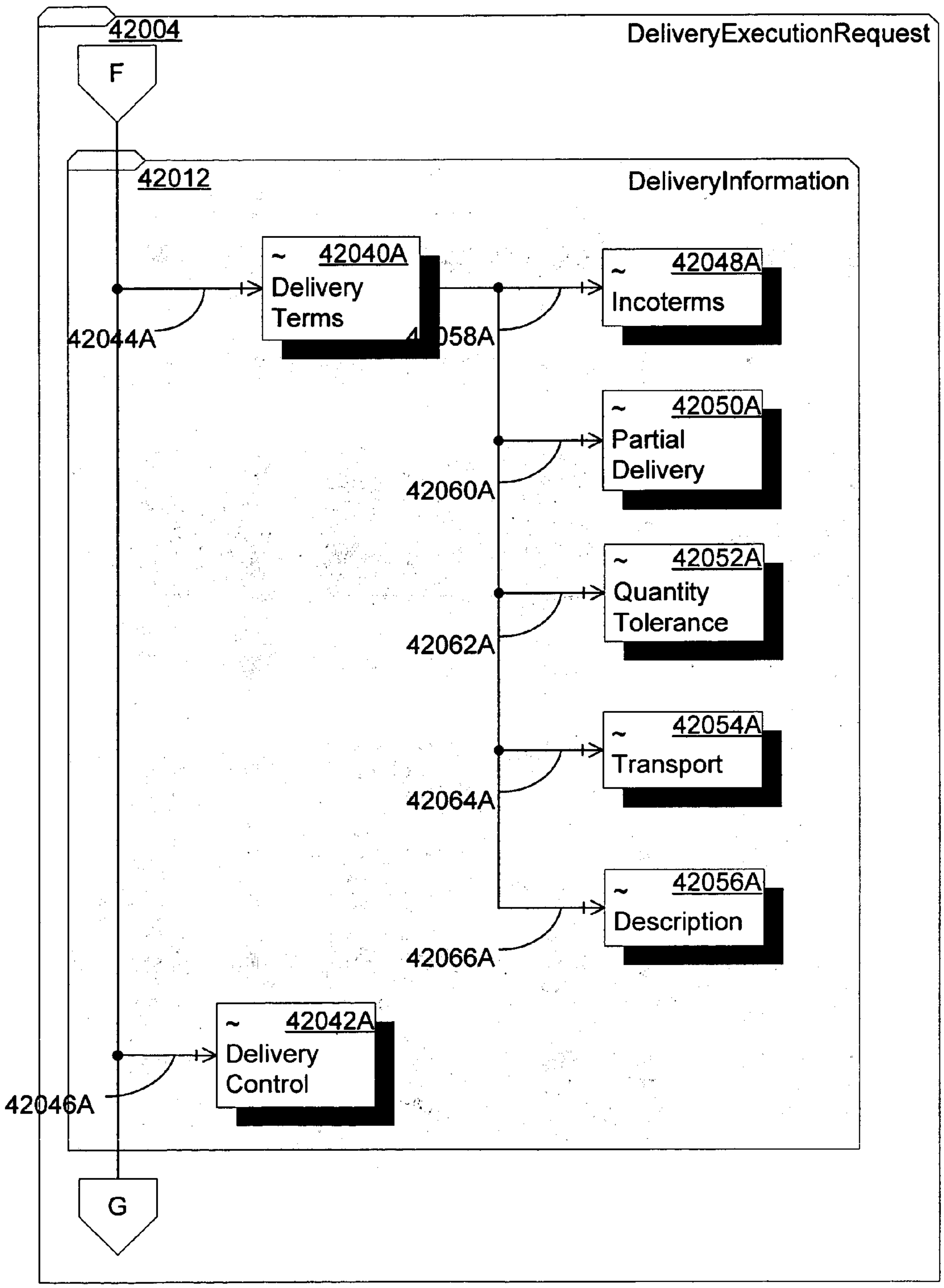
Figure 420G:
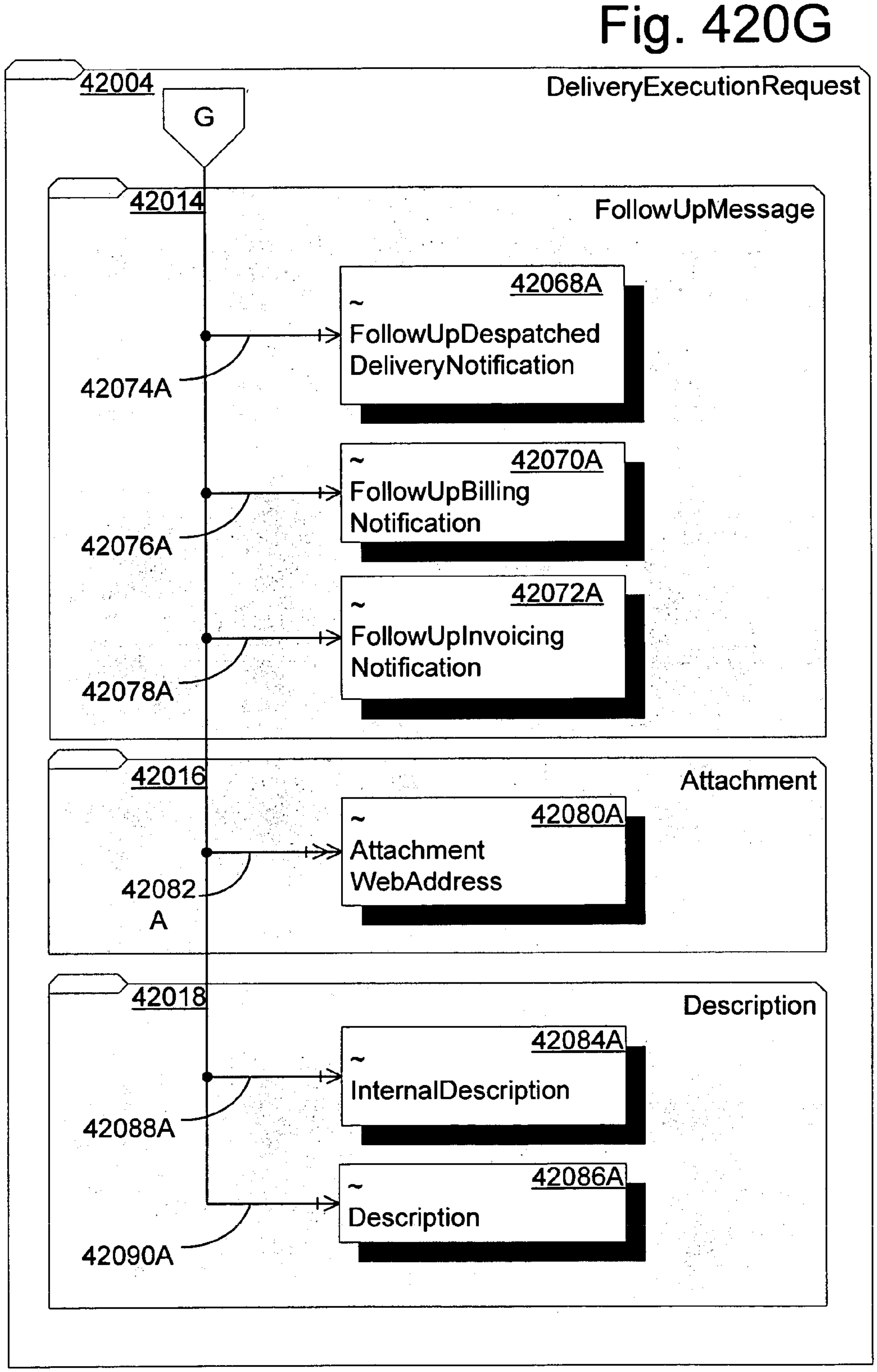
Figure 420H:
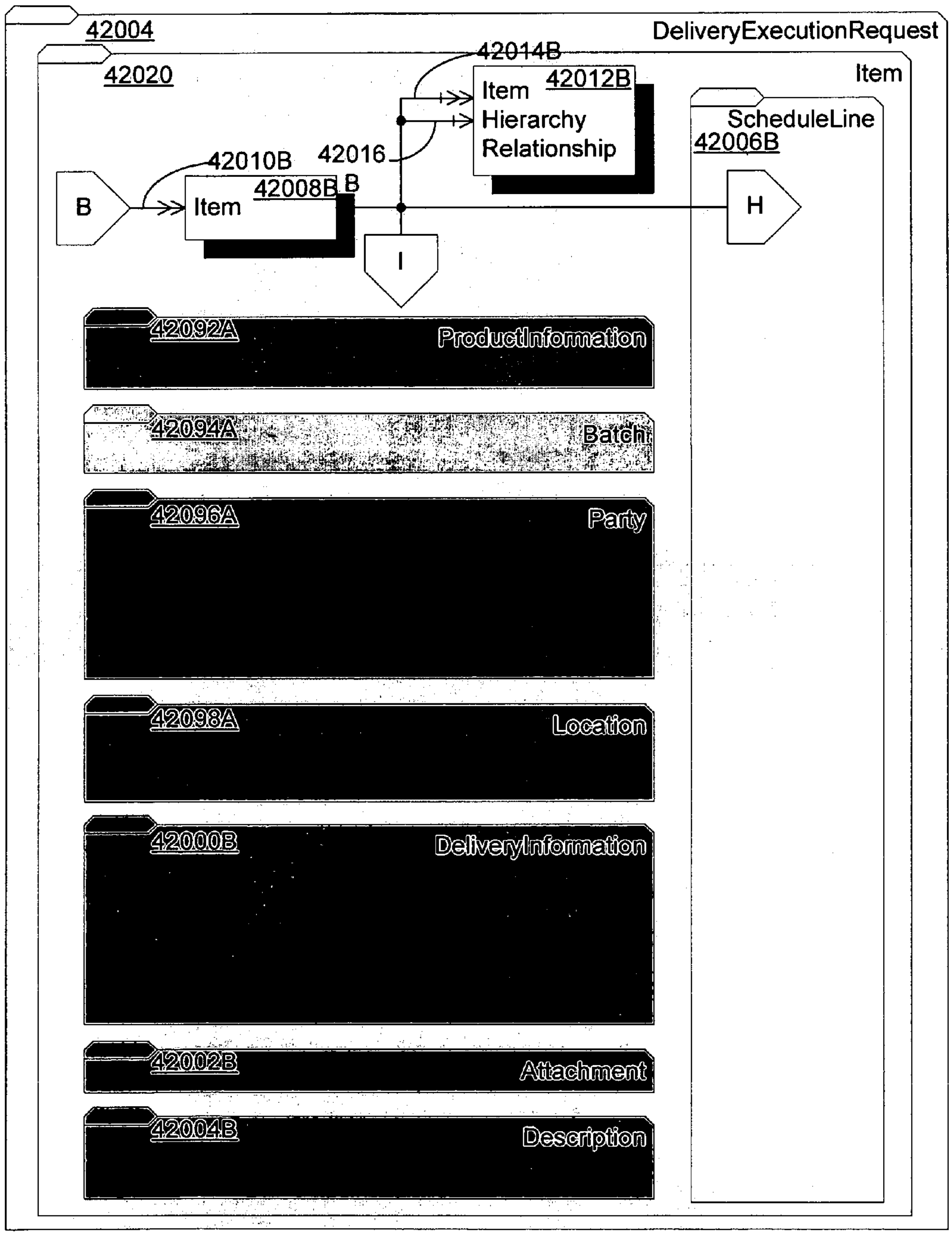
Figure 420I:
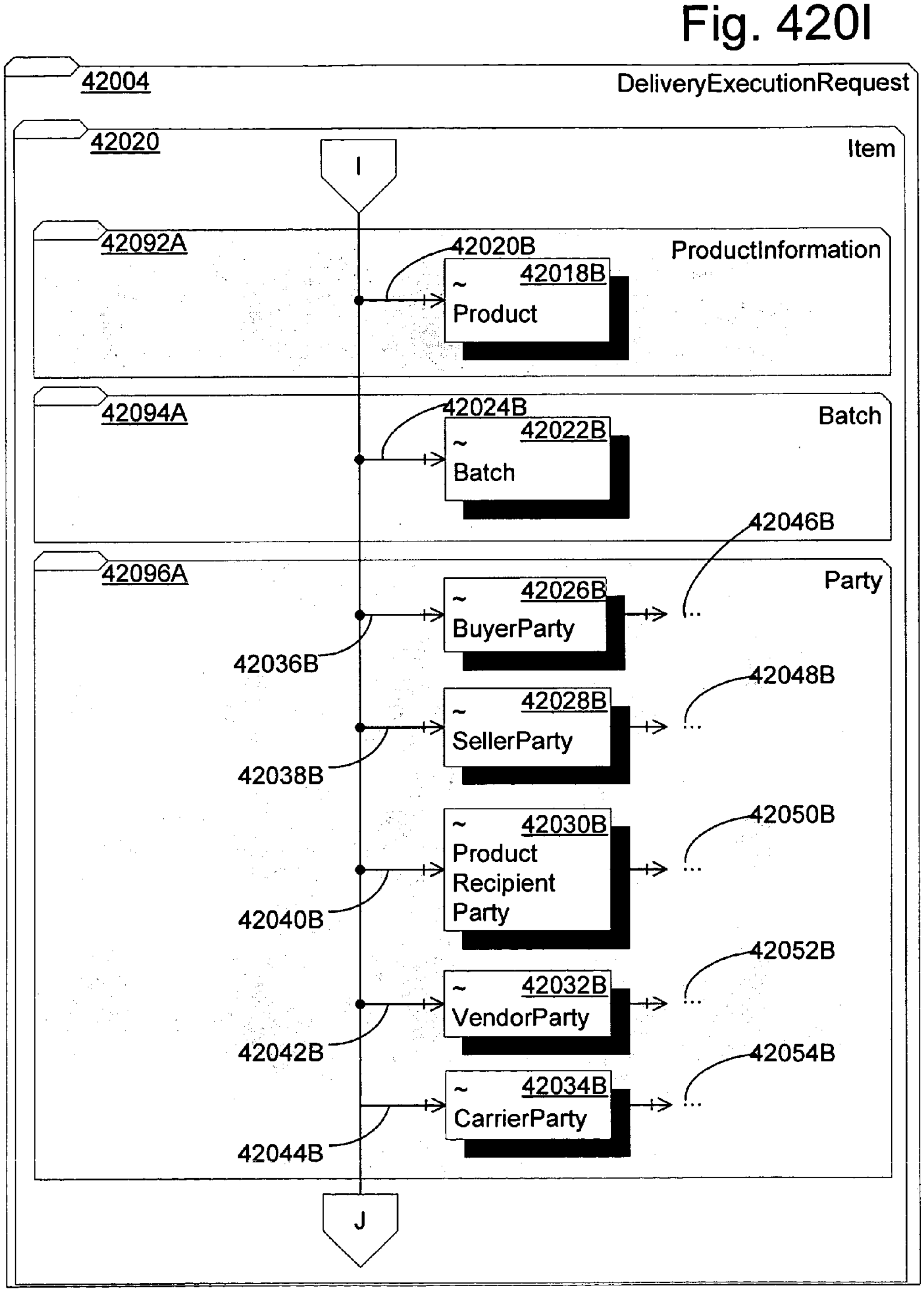
Figure 420J:
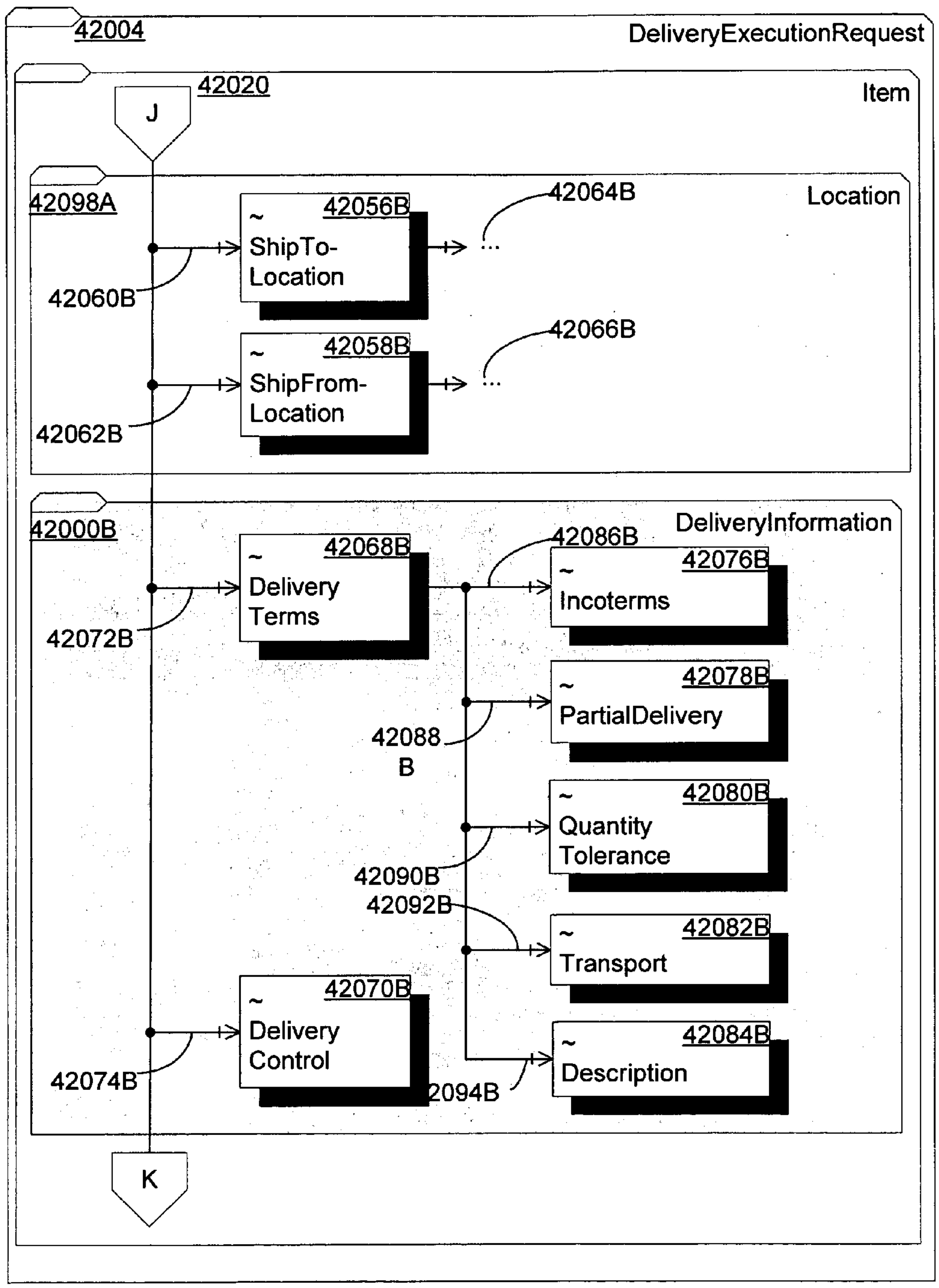
Figure 420K:
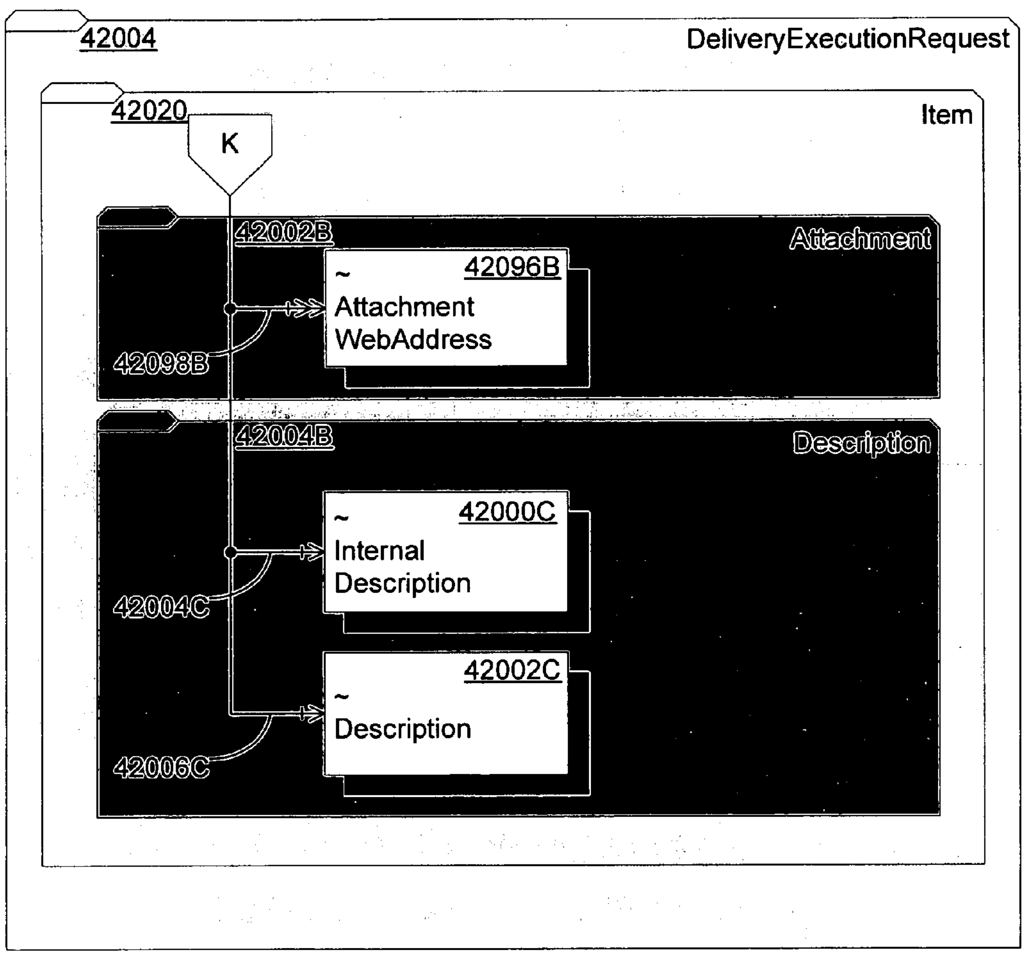
Figure 420L:
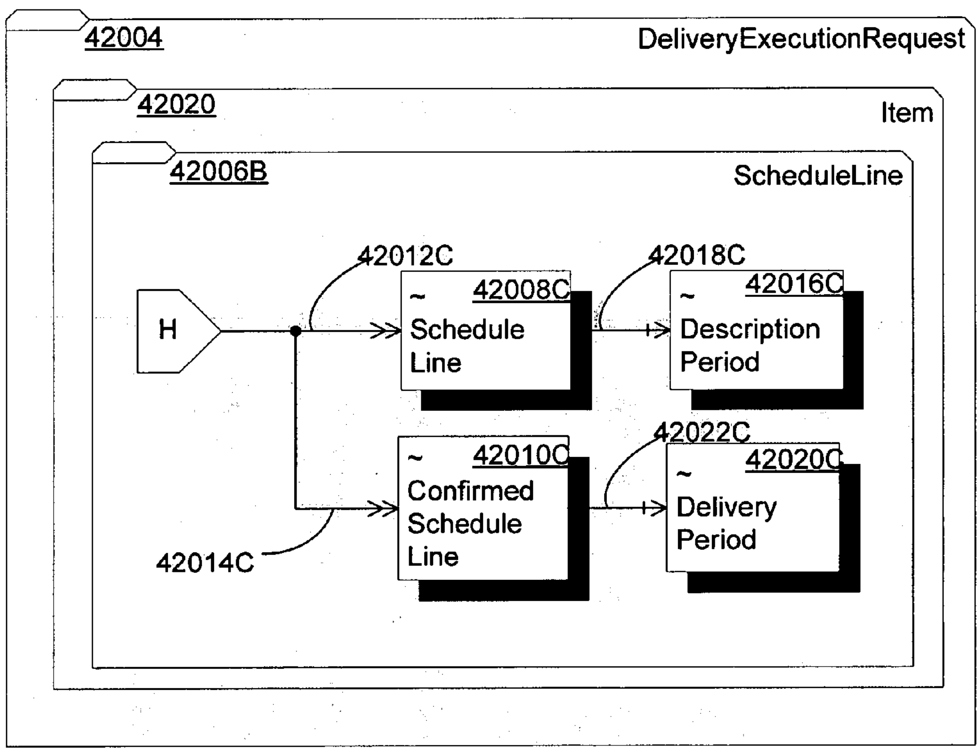
Figure 422:
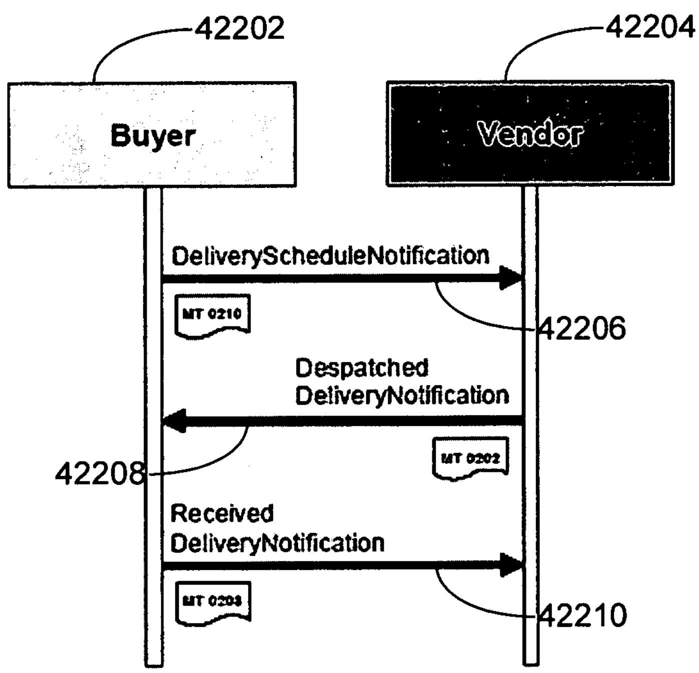
Figure 423A:
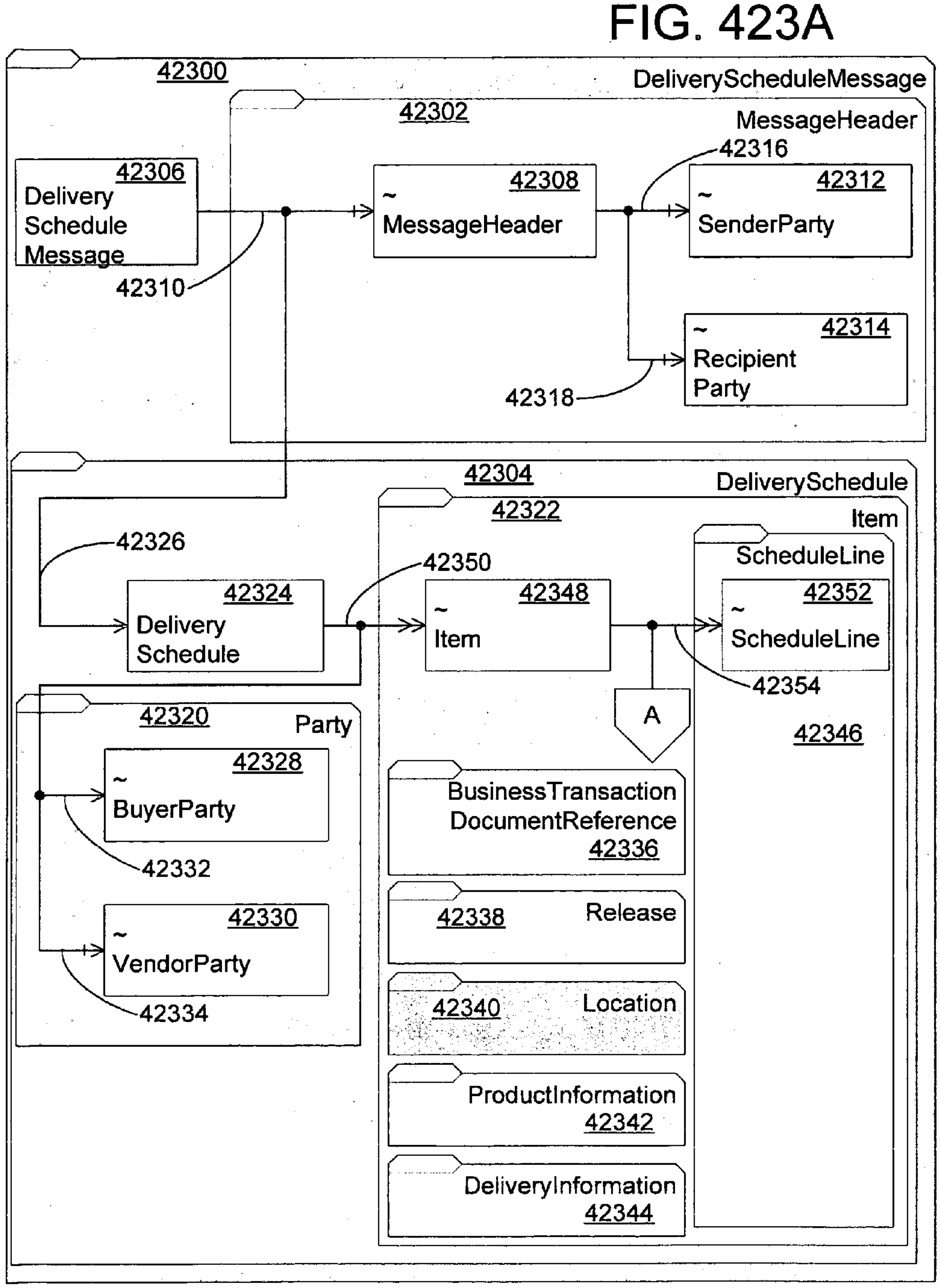
Figure 423B:
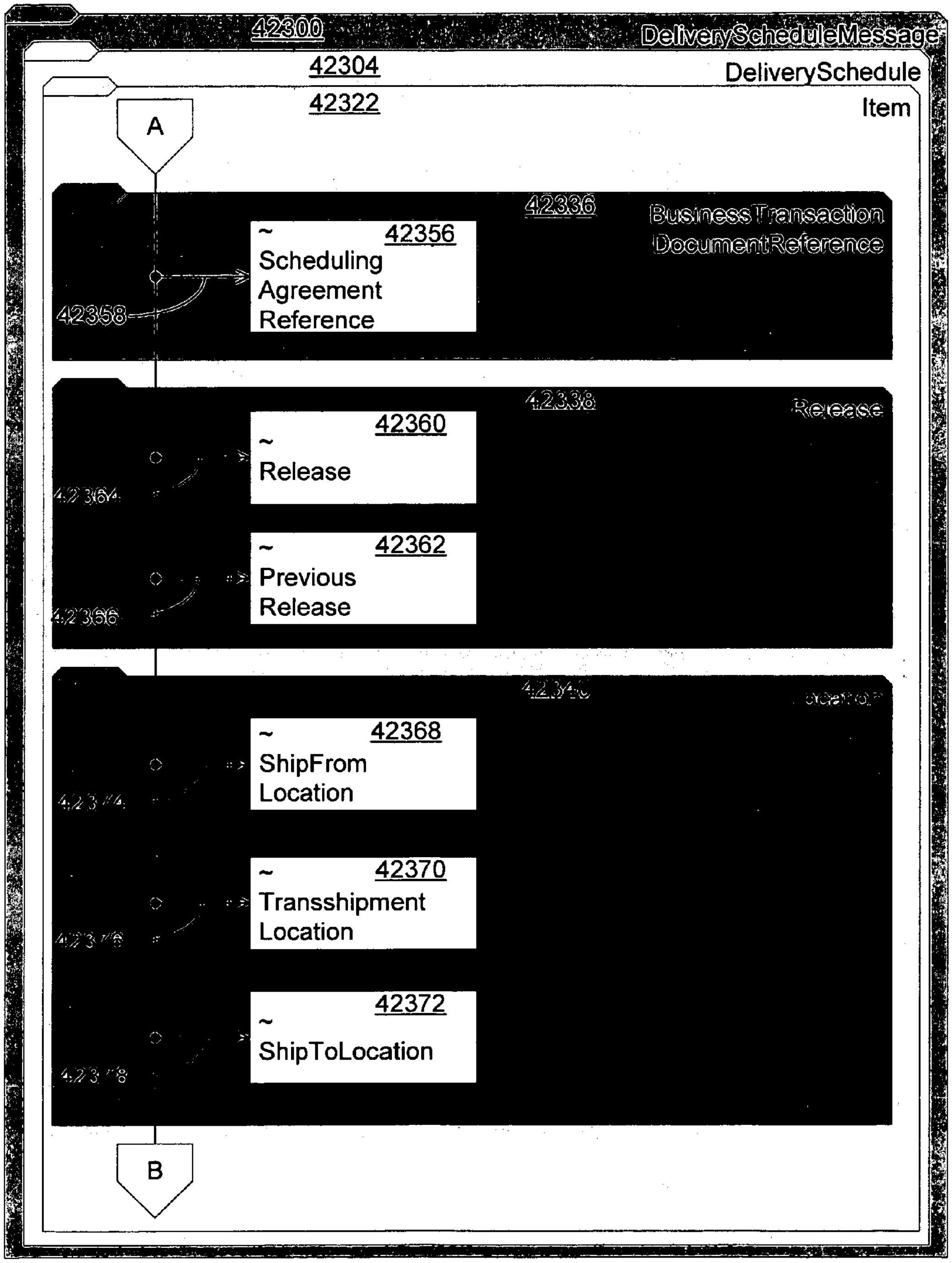
Figure 423C:
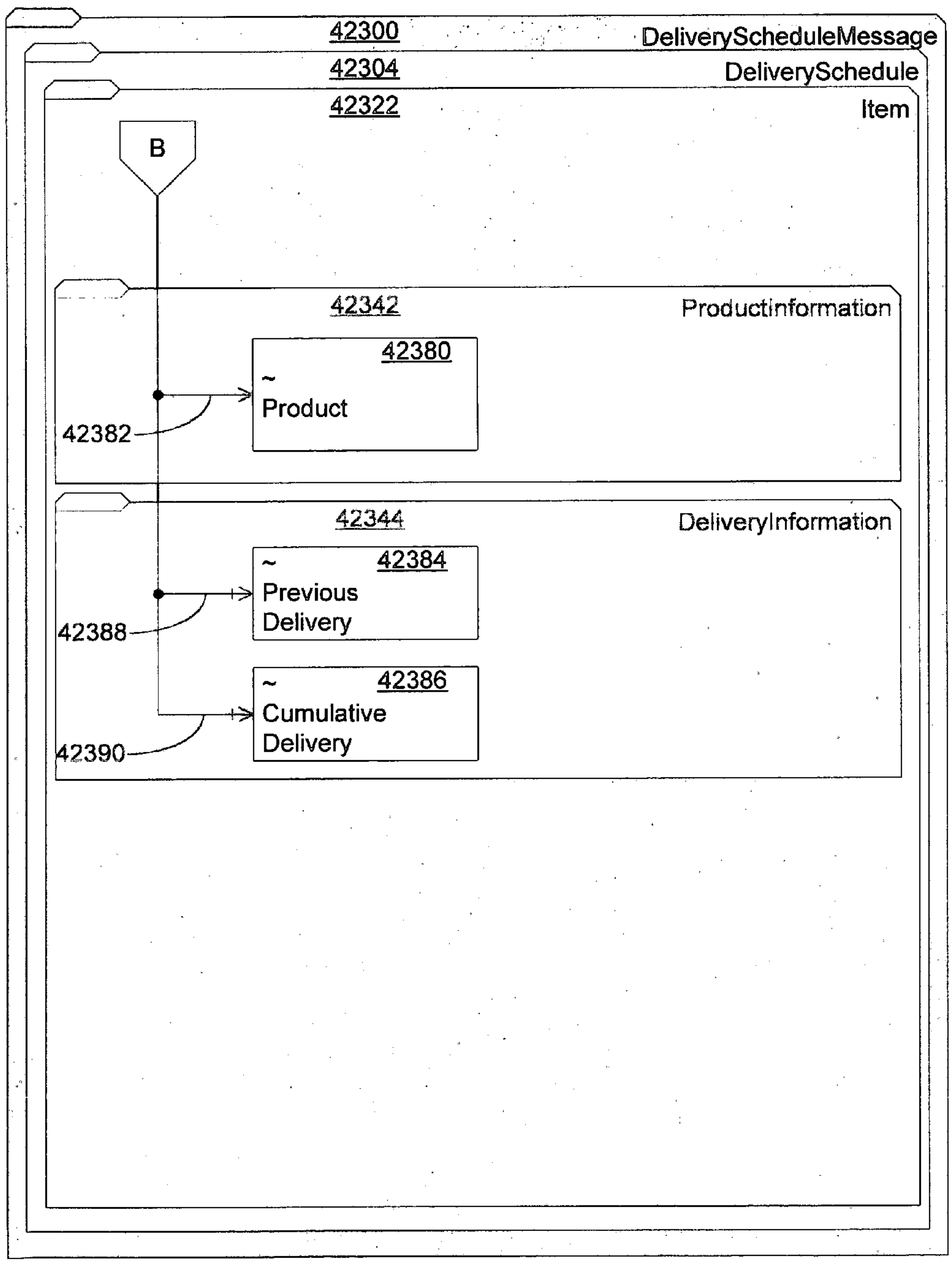
Figure 425:
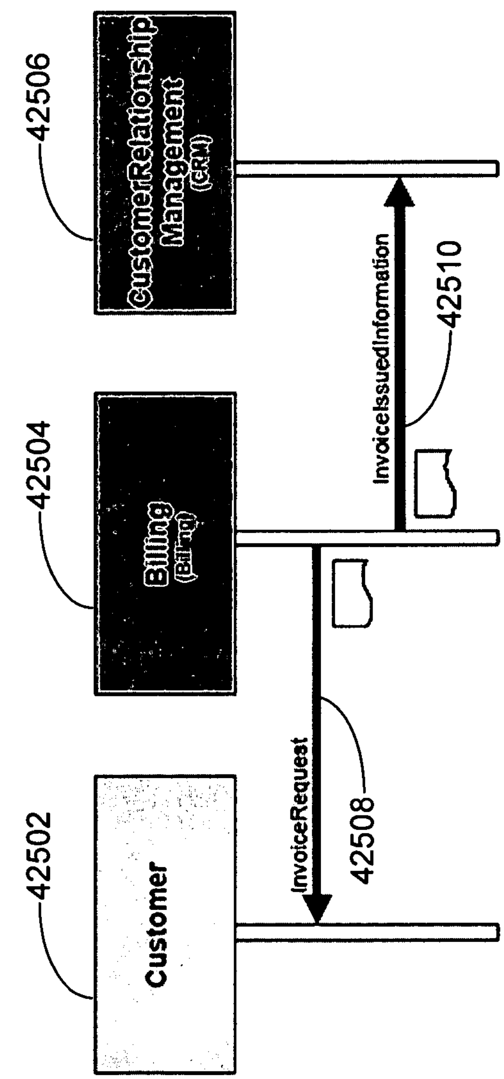
Figure 426:
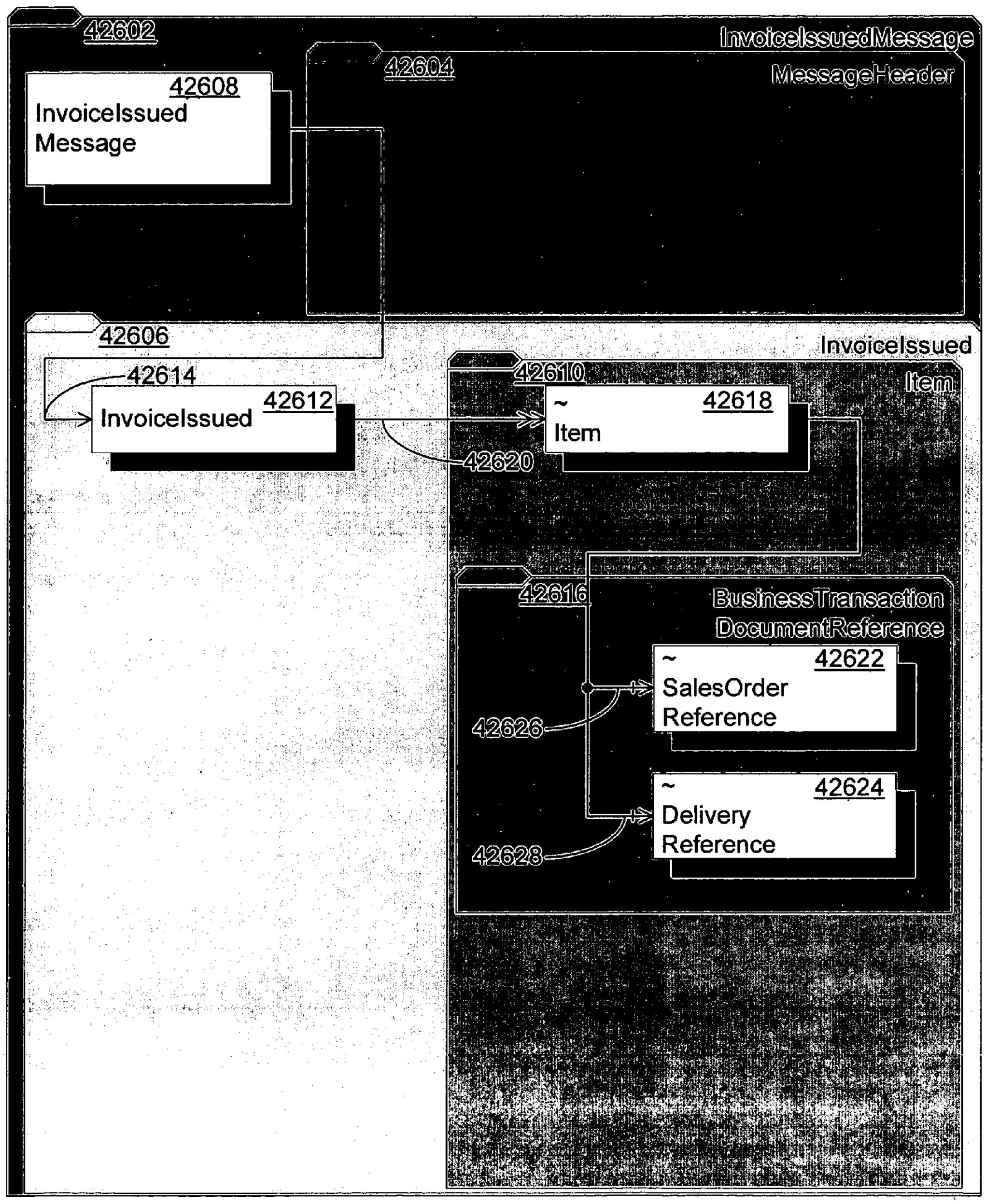
Figure 428:
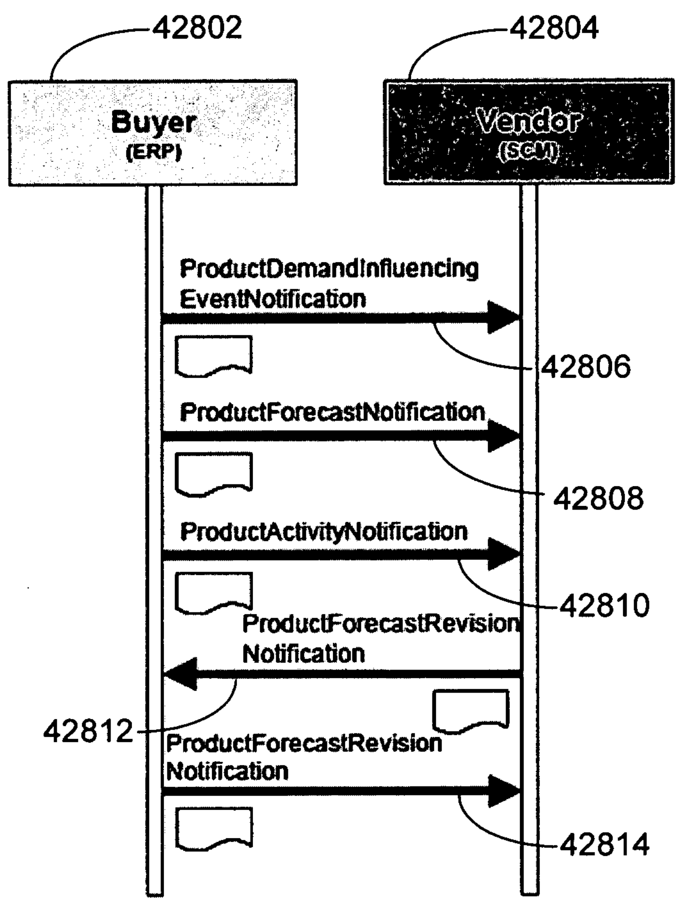
Figure 429:
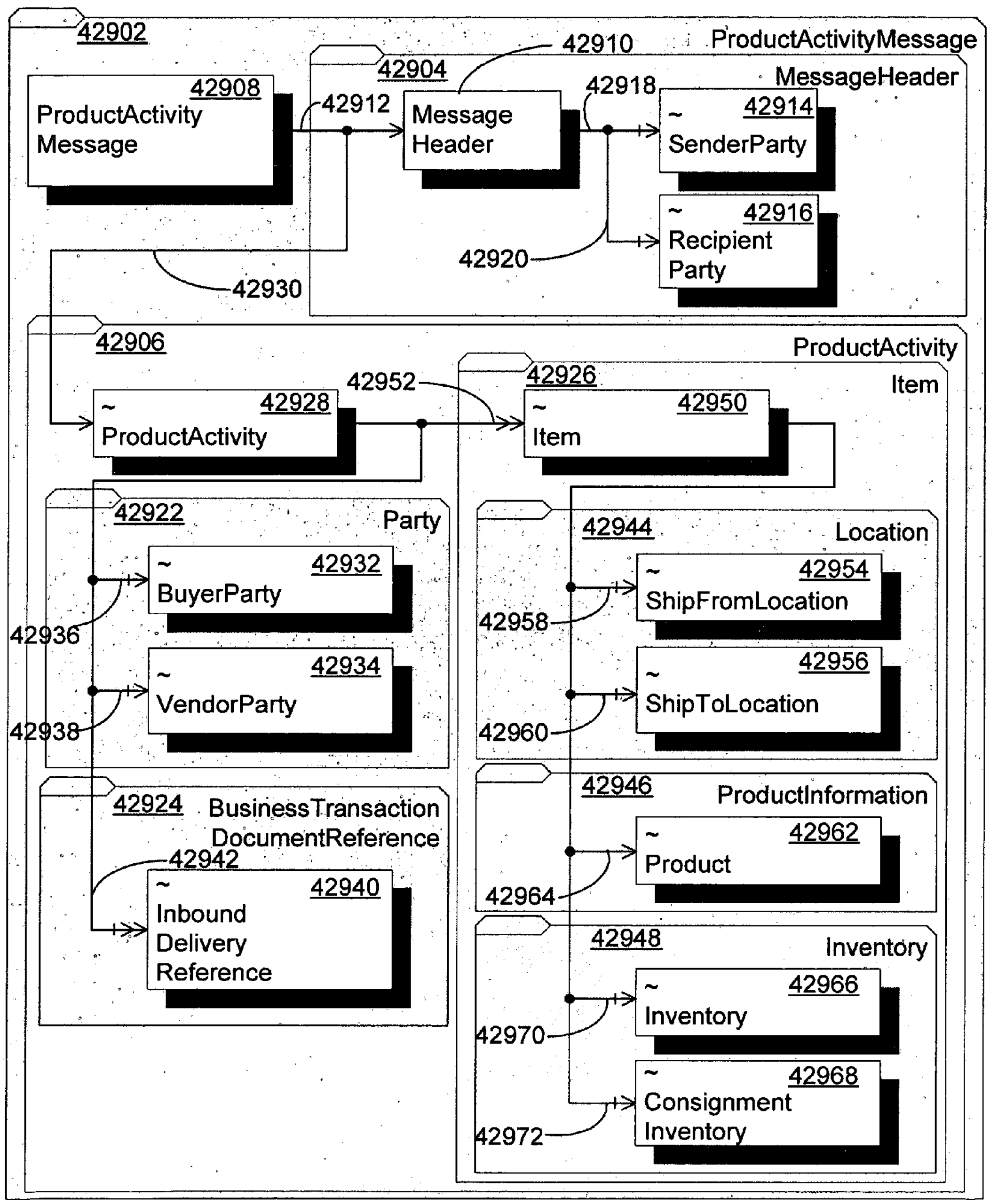
Figure 431:
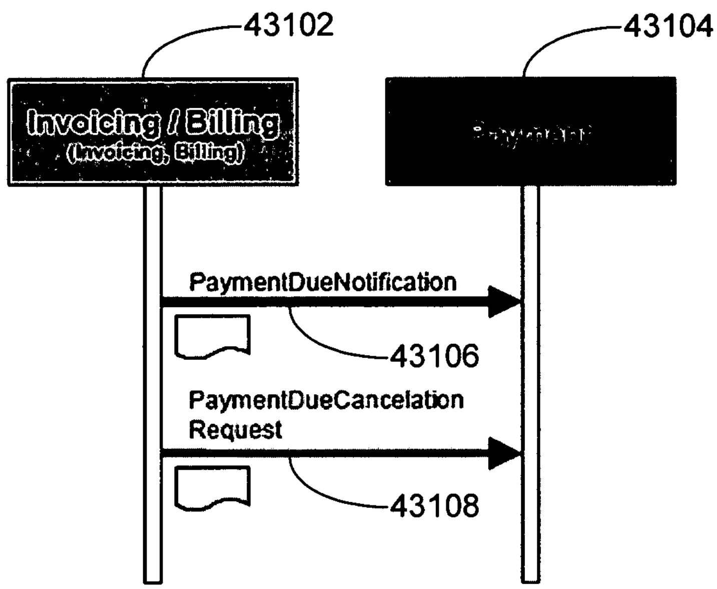
Figure 432A:
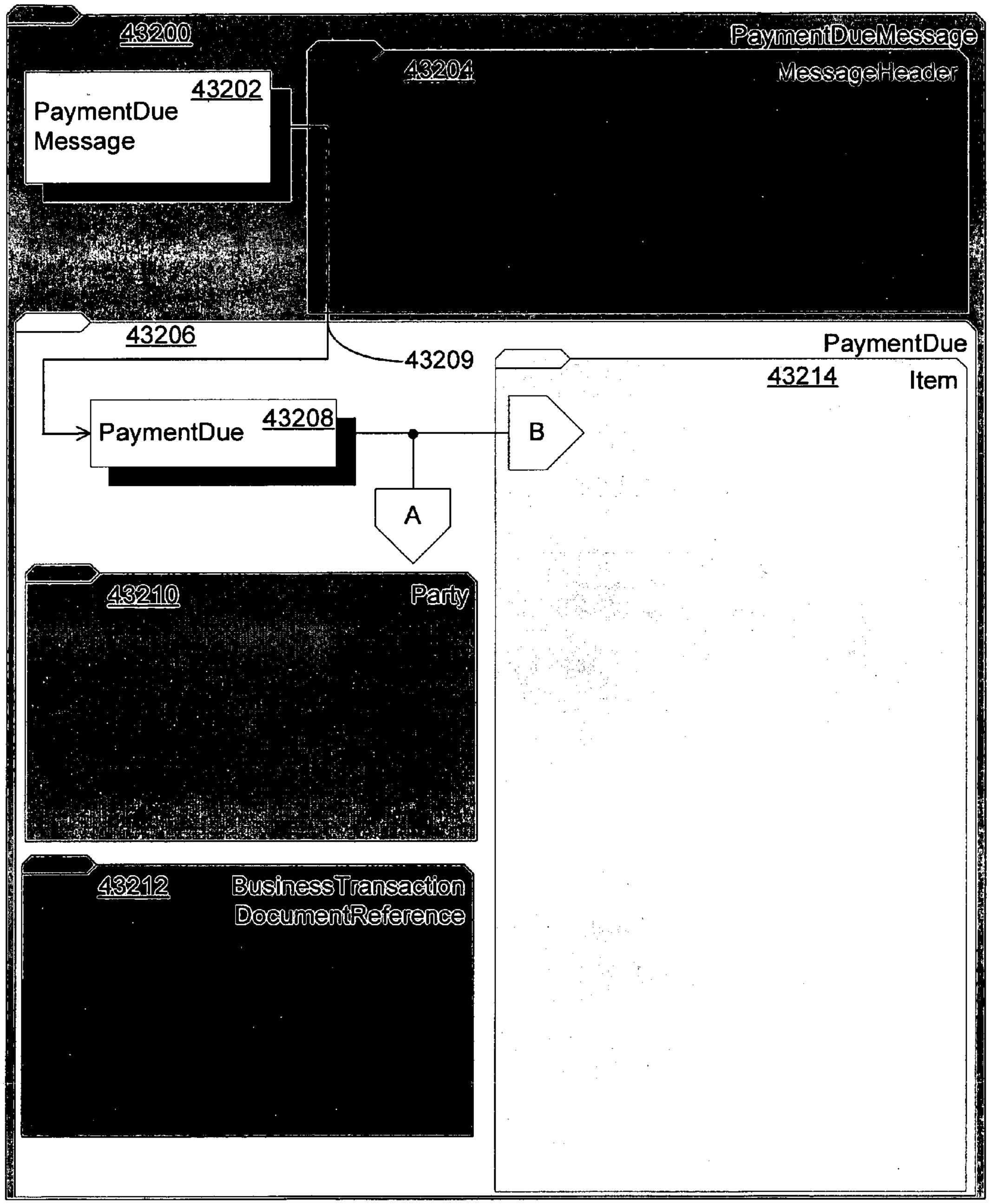
Figure 432B:
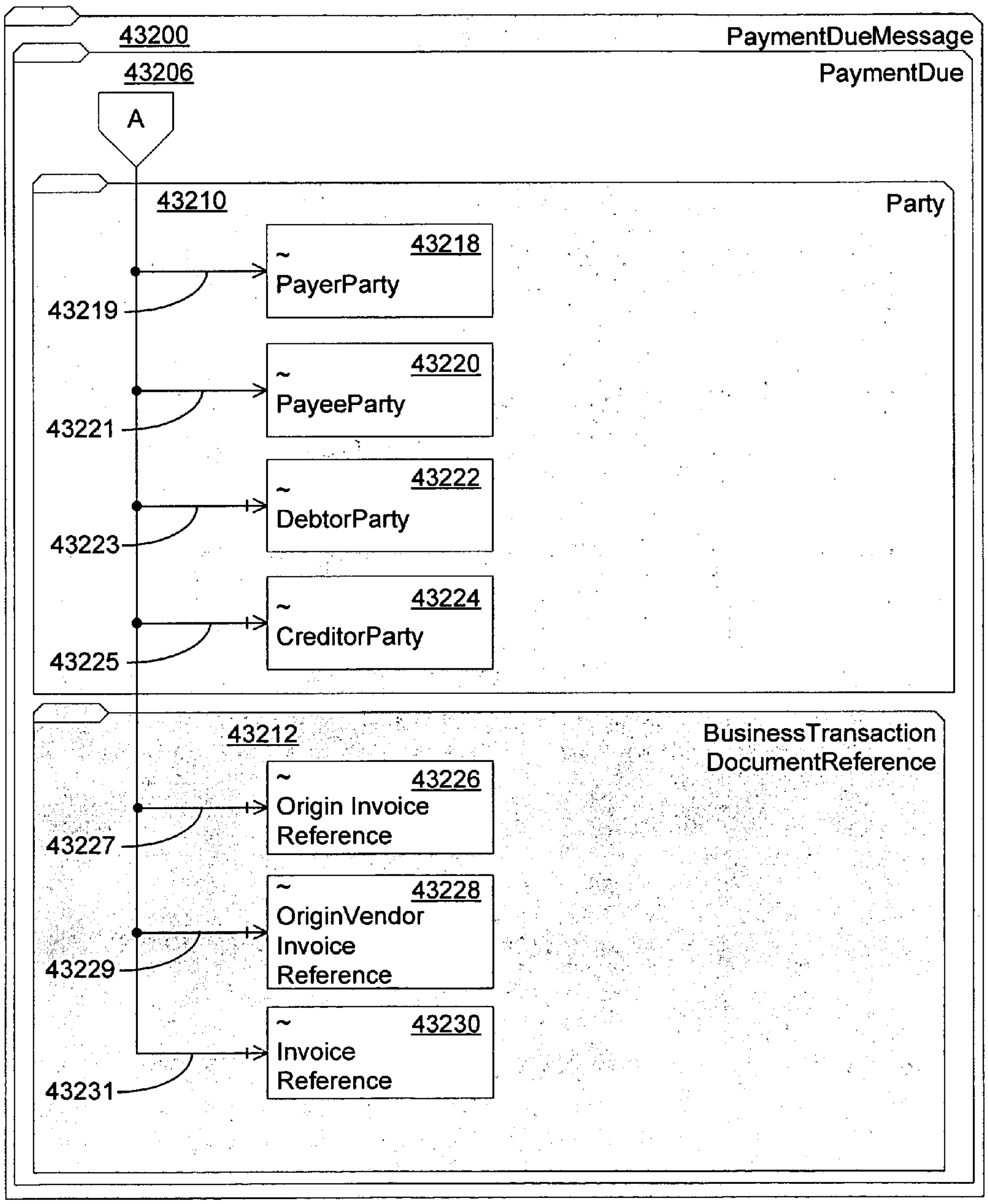
Figure 432C:
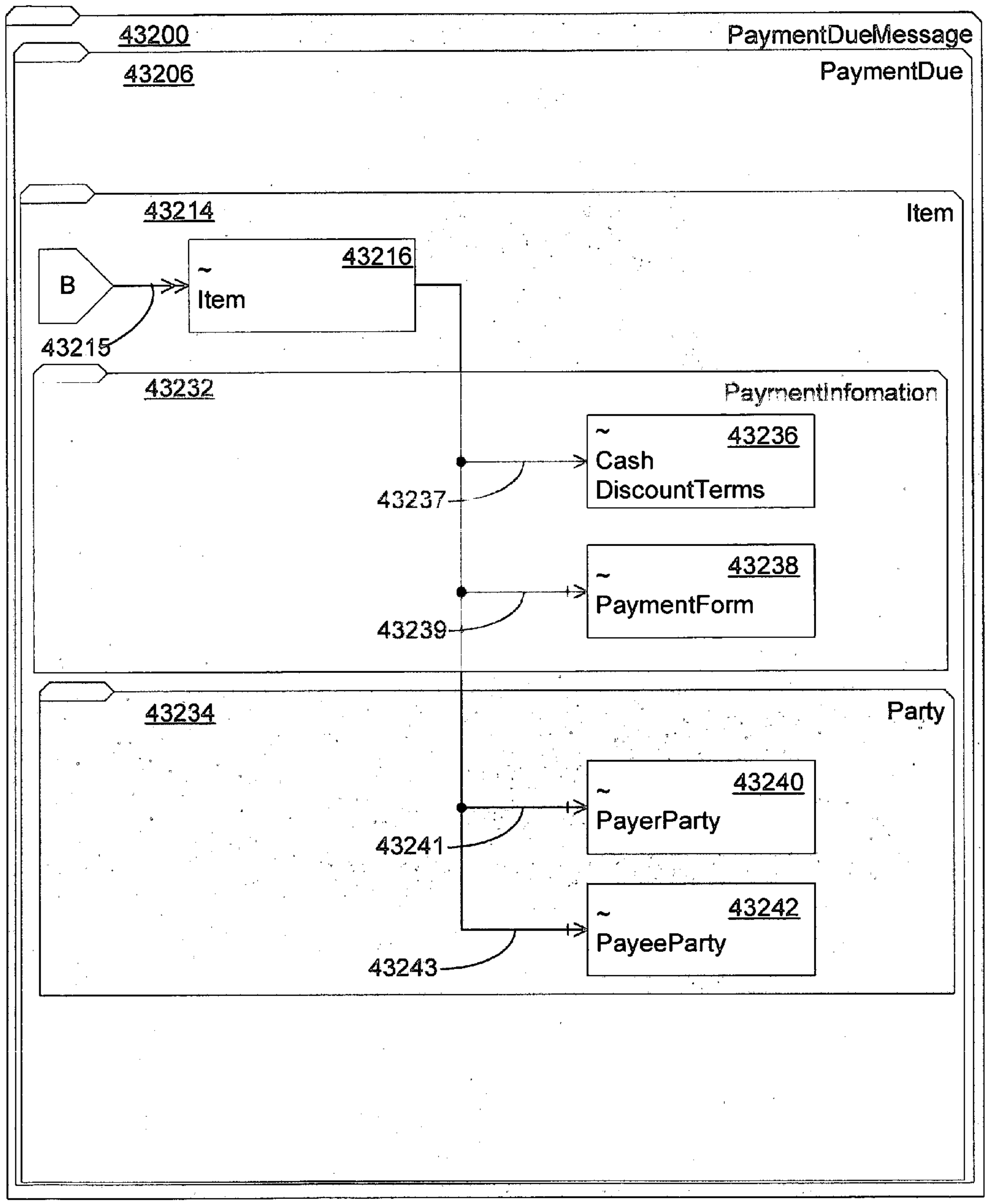

FIGS. 391A-B depict the element structure for CreditWorthinessQuery message;

FIGS. 392A-C depict the element structure for CreditWorthinessMessage message;

FIG. 393 depicts the message choreography for an exemplary credit agency report and query process;

FIG. 394 depicts the data model for the MessageDataTypeCreditAgencyReportQueryMessage used to implement a CreditAgencyReportQuery message;

FIGS. 395A-B depict the data model for a message data type CreditAgencyReportResponse used to implement a CreditAgencyReportResponse message;

FIGS. 396A-C depict the element structure for CreditAgencyReportQuery message;

FIGS. 397A-E depict the element structure for CreditAgencyReportResponse;

FIG. 398 depicts an example message choreography for the AccountingCancellationRequest interface between Invoice/Billing and Accounting;

FIG. 399 depicts the data model for the AccountingCancellationMessage;

FIGS. 400A-B depict the element structure for AccountingCancellationMessage message;

FIG. 401 depicts an example message choreography for exemplary Billing Due Notification and Invoicing Due Notification processes;

FIGS. 402A-M depict a data model for the InvoiceDueMessage;

FIG. 403 depicts a data model for the InvoiceDueCancellationMessage;

FIG. 404A-J depict the element structure for InvoicingDueMessage;

FIG. 405 depicts a graphical representation of an InventoryChangeNotification and an InventoryChangeAccountingNotification between business entities in accordance with methods and systems consistent with the present disclosure;

FIGS. 406A-B depict the data model of the InventoryChangeMessage;

FIGS. 407A-D depict the element structure for the Inventory Change;

FIG. 408 depicts an example message choreography for the interfaces established between Purchasing, Sales, Fulfillment Coordination, Supply Chain Planning, and Supply Chain Execution;

FIGS. 409A-L depict the data model for the SalesOrderFulfillmentMessage;

FIGS. 410A-M depict the element structure for a message data type SalesOrderFulfillmentMessage;

FIG. 411 depicts an example message choreography for the interfaces established between Vendor and Product Recipient;

FIGS. 412A-C depict the data model for the DespatchedDeliveryNotificationMessage;

FIG. 413 depicts the data model for the ReceivedDeliveryNotificationMessage;

FIG. 414A-G depict the element structure for DespatchedDeliveryNotification;

FIG. 415A-C depict the element structure for Receive dDeliveryNotificationMessage;

FIG. 416 depicts an example message choreography for an exemplary invoice accounting notification process;

FIGS. 417A-C depict a data model for the InvoiceAccountingNotification;

FIGS. 418A-E depict the element structure for InvoiceAccountingNotification;

FIG. 419 depicts a graphical representation of a DeliveryExecutionRequest between business entities in accordance with methods and systems consistent with the present disclosure;

FIGS. 420A-L depict a data model for the DeliveryExecutionRequest;

FIGS. 421A-K depict the element structure for the DeliveryExecutionRequest message;

FIG. 422 depicts an example message choreography for an exemplary DeliveryScheduleNotification process;

FIGS. 423A-C depict a data model for the DeliveryScheduleNotification;

FIGS. 424A-O depict the element structure for DeliveryScheduleNotification;

FIG. 425 depicts a graphical representation of an InvoiceIssuedInformation between business entities in accordance with methods and systems consistent with the present disclosure;

FIG. 426 depicts a data model for an InvoiceIssuedMessage;

FIGS. 427A-B depict the element structure of the InvoiceIssuedMessage;

FIG. 428 depicts an example message choreography for scenario "CPFR" associated with a buyer and a vender;

FIG. 429 depicts a data model for a ProductActivityMessage;

FIGS. 430A-L depict the element structure of the ProductActivityMessage;

FIG. 431 depicts the message choreography for Payment Due Notification between two business entities, Invoice/Billing and Payment;

FIGS. 432A-C depict a data model for a PaymentDueMessage; and

FIGS. 433A-D depict the element structure of the PaymentDueMessage.

DETAILED DESCRIPTION

Reference will now be made in detail to an implementation consistent with the present invention as illustrated in the accompanying drawings. Wherever possible, the same reference numbers will be used throughout the drawings and the following description to refer to the same or like parts.

A. Overview

Methods and systems consistent with the present invention facilitate e-commerce by providing consistent interfaces that are suitable for use across industries, across businesses, and across different departments within a business during a business transaction. To generate consistent interfaces, methods and systems consistent with the present invention utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Figure 1A:
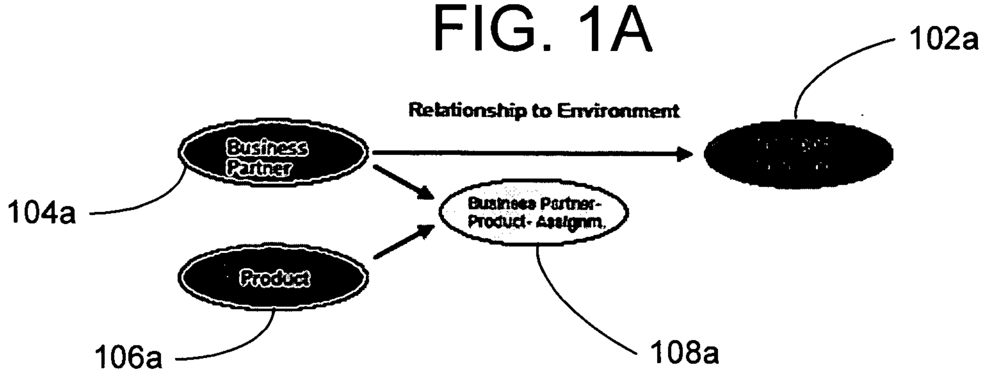
FIGS. 1A-1G depict problems that may arise without the use of consistent interfaces.
Figure 1B:
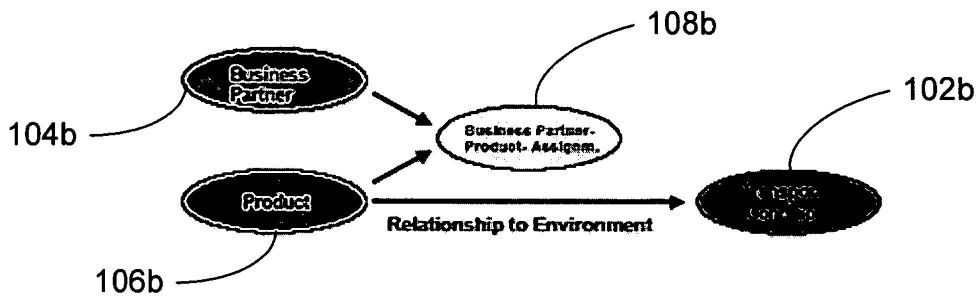
Figure 1C:
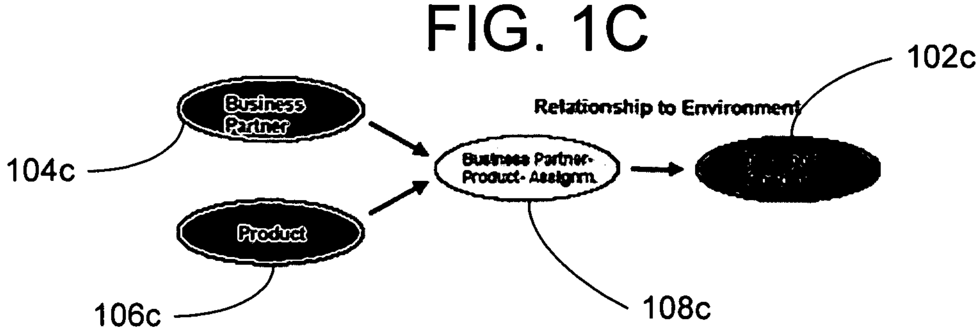

Without cross-component consistency, different conceptual approaches lead to different interface structures, resulting in incompatible interfaces. For example, FIGS. 1A-C depict three different approaches to a transport condition 102*a*, 102*b*, 102*c*, which specifies how products are to be transported. The transport condition 102*a*, 102*b*, 102*c*, considers a business partner 104*a*, 104*b*, 104*c*, a product 106*a*, 106*b*, 106*c*, and a combination of the business partner and the product 108*a*, 108*b*, 108*c*.

As depicted in FIG. 1A, the transport condition 102*a* may depend on the business partner 104*a*. Alternatively, as depicted in FIG. 1B, the transport condition 102*b* may depend on the product 106*b*. As a third alternative, the transport condition 102*c* may depend on the combination of the business partner and the product 108*c*. These three conceptual models represent three different object models that may be used to derive interfaces.

Figure 1D:
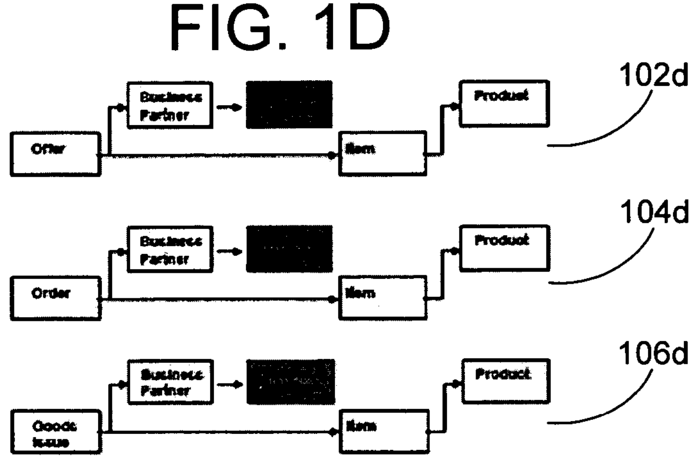
Figure 1E:
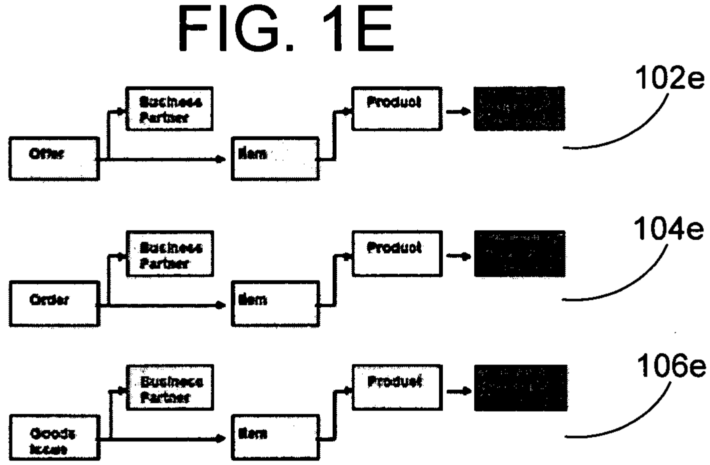
Figure 1F:
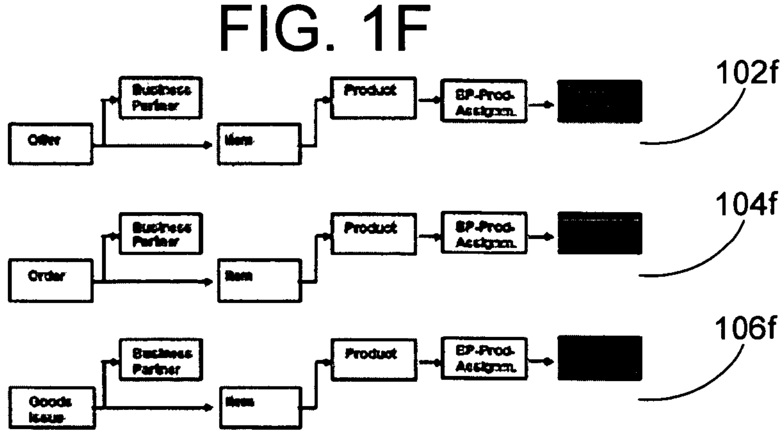
Figure 1G:
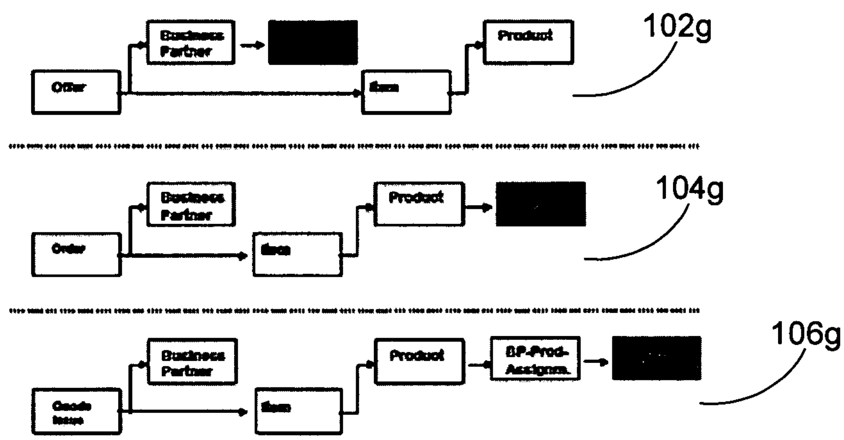

FIGS. 1D-F depict the resulting consistent interfaces from these object models. In particular, FIG. 1D depicts an interface for quotations 102*d*, an interface for purchase orders 104*d* and an interface for goods issued 106*d* derived using the conceptual model depicted in FIG. 1A. FIG. 1E depicts these same respective interfaces 102*e*, 104*e*, 106*e* derived using the conceptual model depicted in FIG. 1B. FIG. 1F depicts these same respective interfaces 102*f*, 104*f*, 106*f* derived using the conceptual model depicted in FIG. 1C. As depicted in FIG. 1G, inconsistent interfaces 102*g*, 104*g*, 106*g* result without a cross-component understanding of a transport condition.

Figure 1:
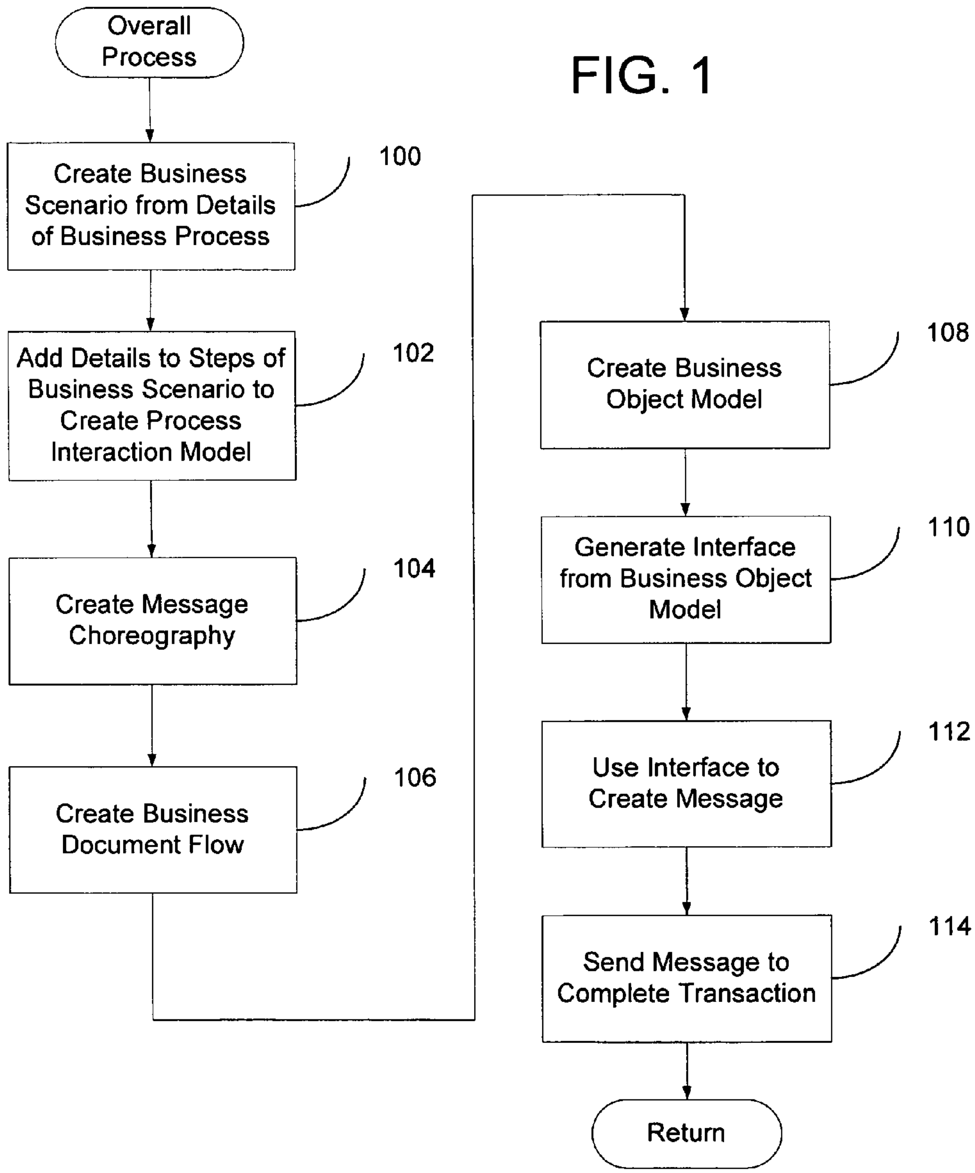
FIG. 1 depicts a flow diagram of the overall steps performed by methods and systems consistent with the present invention.
Figure 2:
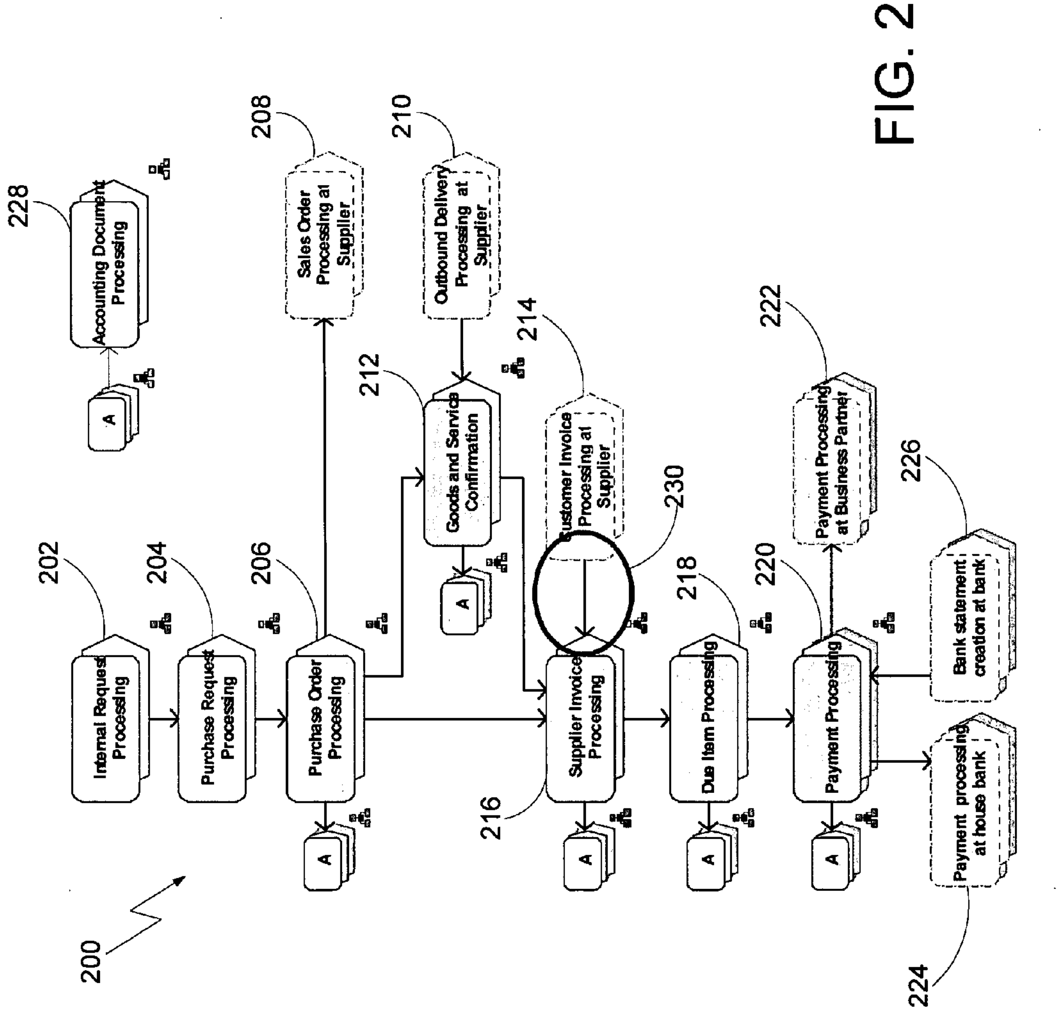
FIG. 2 depicts a scenario variant model in accordance with methods and systems consistent with the present invention.

FIG. 1 depicts a flow diagram of the overall steps performed by methods and systems consistent with the present invention. Initially, to generate the business object model, design engineers study the details of a business process, and model the business process using a "business scenario" (step 100). The business scenario identifies the steps performed by the different business entities during a business process. Thus, the business scenario is a complete representation of a clearly defined business process. For example, in FIG. 2, a scenario variant model is used to depict an illustrative business scenario for a Maintenance Repair Operation ("MRO") Procurement 200. The developers use these scenario variant models to depict the individual process steps performed by the business entities during the business process.

For an MRO Procurement, the customer initially processes an internal request (step 202). The internal request corresponds to the customer's internal documentation for the requested maintenance or repair. The customer then processes a purchase request (step 204). The purchase request corresponds to the customer's internal documentation for a specific product or service related to the maintenance or repair. Next, the customer processes a purchase order (step 206), which is sent to the supplier. This prompts the supplier to process a sales order (step 208). The sales order is the supplier's internal documentation regarding the requested product or service. After processing the sales order, the supplier processes an outbound delivery (step 210), which is the supplier's internal documentation identifying the products or services that will be provided to the customer. The supplier then sends a goods and services confirmation to the customer (step 212). Next, the supplier processes a customer invoice (step 214) and sends the invoice to the customer. Upon receiving the invoice, the customer processes the supplier invoice (step 216). The customer also processes a due item (step 218). The due item summarizes the information regarding the product or service ordered by the customer. Next, the customer processes the payment (step 220) by sending the payment information to the business partner and sending the payment information to the house bank. After receiving the payment information, the business partner processes the payment (step 222), and the bank processes the payment (step 224). The bank also creates a bank statement (step 226) and forwards the bank statement information to the customer. During the MRO Procurement, the customer also processes an accounting document (step 228). The accounting document is the customer's internal documentation regarding the payment to the supplier.

Figure 3:
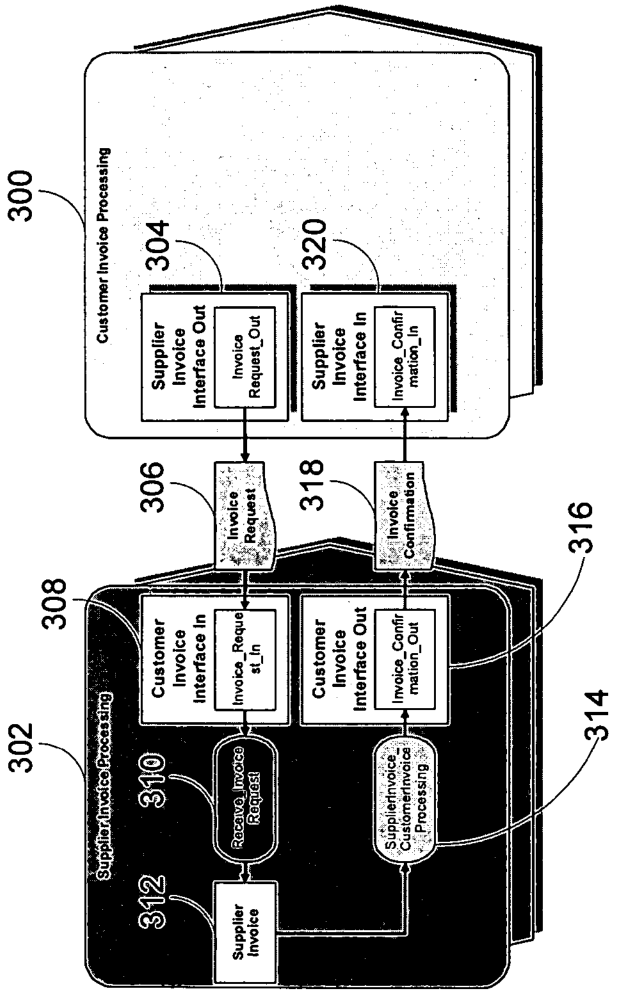
FIG. 3 depicts a process interaction model for invoice processing in accordance with methods and systems consistent with the present invention.

Returning to the overall process in FIG. 1, after creating the business scenario, the developers add details to each step of the business scenario (step 102). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components. For example, FIG. 3 depicts the process interaction model for the invoice processing 230 between the supplier 300, which processes the customer invoice, and the customer 302, which processes the supplier invoice.

The supplier uses an Invoice Request Out interface 304 to send an Invoice Request message 306 to the customer. The customer uses the Invoice Request In interface 308 to receive the Invoice Request message (step 310), and to create an internal instantiation of the supplier invoice 312. The customer processes the supplier invoice (step 314), and uses an Invoice Confirmation Out interface 316 to send an Invoice Confirmation 318 to the supplier. The supplier uses an Invoice Confirmation In interface 320 to receive the Invoice Confirmation 318.

Returning to FIG. 1, after creating the process interaction model, the developers create a "message choreography" (step 104), which depicts the messages transmitted between the two components in the process interaction model. The developers then represent the transmission of the messages between the components during a business process in a "business document flow" (step 106). Thus, the business document flow illustrates the flow of information between the business entities during a business process.

Figure 4:
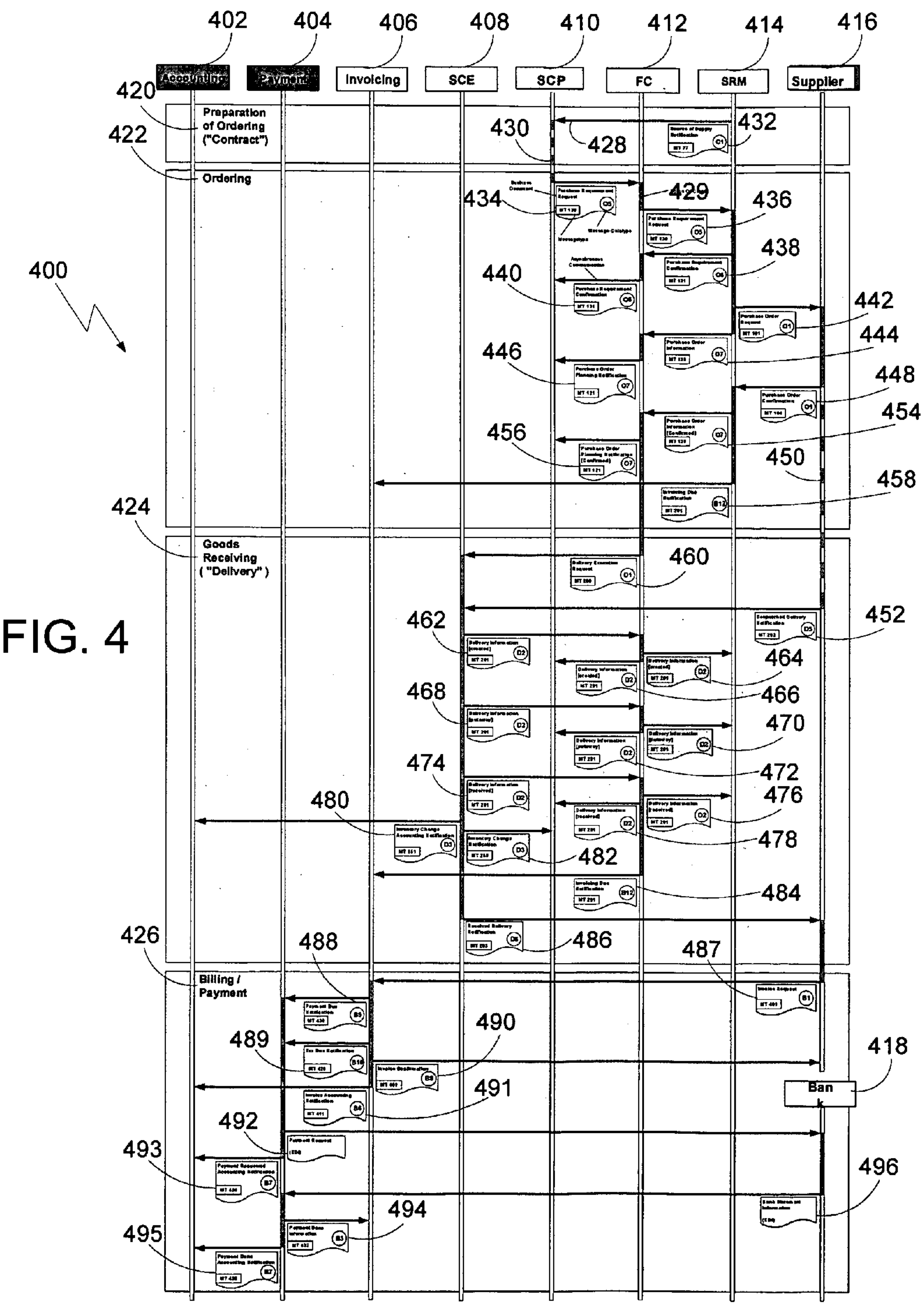
FIG. 4 depicts an exemplary business document flow for an invoice request in accordance with methods and systems consistent with the present invention.

FIG. 4 depicts an exemplary business document flow 400 for the process of purchasing a product or service. The business entities involved with the illustrative purchase process include Accounting 402, Payment 404, Invoicing 406, Supply Chain Execution ("SCE") 408, Supply Chain Planning ("SCP") 410, Fulfillment Coordination ("FC") 412, Supply Relationship Management ("SRM") 414, Supplier 416, and Bank 418. The business document flow 400 is divided into four different transactions: Preparation of Ordering ("Contract") 420, Ordering 422, Goods Receiving ("Delivery") 424, and Billing/Payment 426. In the business document flow, arrows 428 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 429) when the step is required, and a dotted vertical line (e.g., 430) when the step is optional.

During the Contract transaction 420, the SRM 414 sends a Source of Supply Notification 432 to the SCP 410. This step is optional, as illustrated by the optional control line 430 coupling this step to the remainder of the business document flow 400.

During the Ordering transaction 422, the SCP 410 sends a Purchase Requirement Request 434 to the FC 412, which forwards a Purchase Requirement Request 436 to the SRM 414. The SRM 414 then sends a Purchase Requirement Confirmation 438 to the FC 412, and the FC 412 sends a Purchase Requirement Confirmation 440 to the SCP 410. The SRM 414 also sends a Purchase Order Request 442 to the Supplier 416, and sends Purchase Order Information 444 to the FC 412. The FC 412 then sends a Purchase Order Planning Notification 446 to the SCP 410. The Supplier 416, after receiving the Purchase Order Request 442, sends a Purchase Order Confirmation 448 to the SRM 414, which sends a Purchase Order Information confirmation message 454 to the FC 412, which sends a message 456 confirming the Purchase Order Planning Notification to the SCP 410. The SRM 414 then sends an Invoice Due Notification 458 to Invoicing 406.

During the Delivery transaction 424, the FC 412 sends a Delivery Execution Request 460 to the SCE 408. The Supplier 416 could optionally 450 send a Despatched Delivery Notification 452 to the SCE 408. The SCE 408 then sends a message 462 to the FC 412 notifying the FC 412 that the request for the Delivery Information was created. The FC 412 then sends a message 464 notifying the SRM 414 that the request for the Delivery Information was created. The FC 412 also sends a message 466 notifying the SCP 410 that the request for the Delivery Information was created. The SCE 408 sends a message 468 to the FC 412 when the goods have been set aside for delivery. The FC 412 sends a message 470 to the SRM 414 when the goods have been set aside for delivery. The FC 412 also sends a message 472 to the SCP 410 when the goods have been set aside for delivery.

The SCE 408 sends a message 474 to the FC 412 when the goods have been delivered. The FC 412 then sends a message 476 to the SRM 414 indicating that the goods have been delivered, and sends a message 478 to the SCP 410 indicating that the goods have been delivered. The SCE 408 then sends an Inventory Change Accounting Notification 480 to Accounting 402, and an Inventory Change Notification 482 to the SCP 410. The FC 412 sends an Invoice Due Notification 484 to Invoicing 406, and SCE 408 sends a Received Delivery Notification 486 to the Supplier 416.

During the Billing/Payment transaction 426, the Supplier 416 sends an Invoice Request 487 to Invoicing 406. Invoicing 406 then sends a Payment Due Notification 488 to Payment 404, a Tax Due Notification 489 to Payment 404, an Invoice Confirmation 490 to the Supplier 416, and an Invoice Accounting Notification 491 to Accounting 402. Payment 404 sends a Payment Request 492 to the Bank 418, and a Payment Requested Accounting Notification 493 to Accounting 402. Bank 418 sends a Bank Statement Information 496 to Payment 404. Payment 404 then sends a Payment Done Information 494 to Invoicing 406 and a Payment Done Accounting Notification 495 to Accounting 402.

Within a business document flow, business documents having the same or similar structures are marked. For example, in the business document flow 400 depicted in FIG. 4, Purchase Requirement Requests 434, 436 and Purchase Requirement Confirmations 438, 440 have the same structures. Thus, each of these business documents is marked with an "O6." Similarly, Purchase Order Request 442 and Purchase Order Confirmation 448 have the same structures. Thus, both documents are marked with an "O1." Each business document or message is based on a message type. The message type is identified within the rectangle within each of the business documents depicted in the business document flow. For example, Source of Supply Notification 432 is based on message type 77, as reflected by "MT 77." A list of various message types with their corresponding codes and a description of each message type is provided below.

| Code | Name | Description |
|---|---|---|
| 0077 | Source of Supply Notification | A SourceOfSupplyNotification is a notice to Supply Chain Planning about available sources of supply. |
| 0080 | Catalogue Update Notification | A CatalogueUpdateNotification is a notice from a catalogue provider to an interested party about a new catalogue transmitted in the message or about changes to an existing catalogue transmitted in the message. |
| 0081 | Catalogue Publication Request | A CataloguePublicationRequest is a request from catalogue authoring to the Catalogue Search Engine (the publishing system) to publish a new or changed catalogue or to delete an already published catalogue (the catalogue is possibly split into several transmission packages). |
| 0082 | CataloguePublication TransmissionPackage Notification | A CataloguePublicationTransmissionPackageNotification is the notification of the Catalogue Search Engine (the publishing system) to Catalogue Authoring about a package of a catalogue publication transmission and information about the reception of this package and the validity of its content. |
| 0083 | CataloguePublication Confirmation | A CataloguePublicationConfirmation is the confirmation of the Catalogue Search Engine (the publishing system) to Catalogue Authoring whether the publication or deletion of a catalogue requested by a CataloguePublicationRequest was successful or not. |
| 0084 | CataloguePublication Transmission CancellationRequest | A CataloguePublicationTransmissionCancellationRequest is the request of Catalogue Authoring to Catalogue Search Engine (the publishing system) to cancel the transmission of a catalogue and to restore an earlier published state (if such exists) of the catalogue. Moreover, no more packages are sent for this transmission. |
| 0085 | CataloguePublication TransmissionCancellation Confirmation | A CataloguePublicationTransmissionCancellationConfirmation is the confirmation of Catalogue Search Engine (the publishing system) whether the transmission of a catalogue has been cancelled successfully and an earlier published state of this catalogue (if such exists) has been restored or not. |
| 0086 | CataloguePublication TransmissionItemLock Request | A CataloguePublicationTransmissionItemLockRequest is the request of Catalogue Authoring to lock single items of the catalogue contained in the catalogue publication transmission. |
| 0087 | Catalogue Publication Transmission Item Lock Confirmation | A CataloguePublicationTransmissionItemLockConfirmation is the confirmation of Catalogue Search Engine (the publishing system) to Catalogue Authoring whether single items of the catalogue contained in the catalogue publication transmission could be locked or not. To lock means that if the catalogue is not yet published the items must not be published and if the catalogue is already published, the publication of these items must be revoked. |
| 0101 | Purchase Order Request | A PurchaseOrderRequest is a request from a purchaser to a seller to deliver goods or provide services. |
| 0102 | Purchase Order Change Request | A PurchaseOrderChangeRequest is a change to a purchaser's request to the seller to deliver goods or provide services. |
| 0103 | Purchase Order Cancellation Request | A PurchaseOrderCancellationRequest is the cancellation of a purchaser's request to the seller to deliver goods or provide services. |
| 0104 | Purchase Order Confirmation | A PurchaseOrderConfirmation is a confirmation, partial confirmation, or change from a seller to the purchaser, regarding the requested delivery of goods or provision of services. |
| 0120 | Purchase Order Information | A PurchaseOrderInformation is information from a purchasing system for interested recipients about the current state of a purchase order when creating or changing a purchase order, confirming a purchase order or canceling a purchase order. |
| 0121 | Purchase Order Planning Notification | A PurchaseOrderPlanningNotification is a message by means of which planning applications are notified about those aspects of a purchase order that are relevant for planning. |
| 0130 | Purchase Requirement Request | A PurchaseRequirementRequest is a request from a requestor to a purchaser to (externally) procure products (materials, services) (external procurement). |
| 0131 | Purchase Order Requirement Confirmation | A PurchaseRequirementConfirmation is a notice from the purchaser to the requestor about the degree of fulfillment of a requirement. |
| 0140 | Product Demand Influencing Event Notification | A ProductDemandInfluencingEventNotification is a notification about an event which influences the supply or demand of products. |
| 0141 | Product Forecast Notification | A ProductForecastNotification is a notification about future product demands (forecasts). |

-continued

| Code | Name | Description |
|---|---|---|
| 0142 | Product Forecast Revision Notification | A ProductForecastRevisionNotification is a notification about the revision of future product demands (forecasts). |
| 0145 | Product Activity Notification | A ProductActivityNotification is a message which communicates product-related activities of a buyer to a vendor. Based on this, the vendor can perform supply planning for the buyer. |
| 0151 | RFQ Request | An RFQRequest is the request from a purchaser to a bidder to participate in a request for quotation for a product. |
| 0152 | RFQ Change Request | An RFQChangeRequest is a change to the purchaser's request for a bidder to participate in the request for quotation for a product. |
| 0153 | RFQ Cancellation Request | An RFQCancellationRequest is a cancellation by the purchaser of a request for quotation for a product. |
| 0154 | RFQ Result Notification | An RFQResultNotification is a notification by a purchaser to a bidder about the type and extent of the acceptance of a quote or about the rejection of the quote. |
| 0155 | Quote Notification | A QuoteNotification is the quote of a bidder communicated to a purchaser concerning the request for quotation for a product by the purchaser. |
| 0160 | Sales Order Fulfillment Request | A SalesOrderFulfillmentRequest is a request (or change or cancellation of such a request) from a selling component to a procuring component, to fulfill the logistical requirements (e.g., available-to-promise check, scheduling, requirements planning, procurement, and delivery) of a sales order. |
| 0161 | Sales Order Fulfillment Confirmation | A SalesOrderFulfillmentConfirmation is a confirmation, partial confirmation or change from the procuring component to the selling component, regarding a sales order with respect to which procurement has been requested. |
| 0185 | Order ID Assignment Notification | An OrderIDAssignmentNotification is a message that allows a buyer to assign a vendor order numbers for identifying "purchase orders generated by the vendor." |
| 0200 | Delivery Execution Request | A DeliveryExecutionRequest is a request to a warehouse or supply chain execution to prepare and execute the outbound delivery of goods or the acceptance of an expected or announced inbound delivery. |
| 0201 | Delivery Information | A DeliveryInformation is a message about the creation, change, and execution status of a delivery. |
| 0202 | Despatched Delivery Notification | A DespatchedDeliveryNotification is a notification communicated to a product recipient about the planned arrival, pickup, or issue date of a ready-to-send delivery, including details about the content of the delivery. |
| 0203 | Received Delivery Notification | A ReceivedDeliveryNotification is a notification communicated to a vendor about the arrival of the delivery sent by him to the product recipient, including details about the content of the delivery. |
| 0210 | Delivery Schedule Notification | A DeliveryScheduleNotification is a message that is sent from a buyer to a vendor to notify the latter about the quantity of a product to be delivered with a certain liability at a certain date in accordance with a given scheduling agreement between buyer and vendor. |
| 0213 | Vendor Generated Order Notification | A VendorGeneratedOrderNotification is a message that is used by a vendor/seller to transfer the replenishment order that he has initiated and planned to a customer/buyer so that the latter can create a purchase order. The notification sent by the vendor/seller to the customer/buyer regarding the planned replenishment order can be regarded as a "purchase order generated by the seller." |
| 0214 | Vendor Generated Order Confirmation | VendorGeneratedOrderConfirmation is the confirmation from a customer/buyer that a purchase order has been created for the replenishment order initiated and planned by his vendor/seller.<br>This confirmation from the customer/buyer for a "purchase order generated by the seller" can be regarded as a "purchase order" in the traditional sense, which, in turn, triggers the corresponding fulfillment process at the vendor/seller. |
| 0216 | Replenishment Order Notification. | A ReplenishmentOrderNotification is a message that is used by Logistics Planning (SCP, vendor) to transfer a replenishment order planned for a customer/buyer to Logistics Execution (SCE, vendor) in order to trigger further processing for the order and prepare the outbound delivery. |
| 0217 | Replenishment Order Confirmation | A ReplenishmentOrderConfirmation is a message that is used by Logistics Execution (SCE, vendor) to confirm to Logistics Planning (SCP, vendor) that a replenishment order that is planned for a customer/buyer can be fulfilled. |
| 0240 | Service Acknowledgement Request | A ServiceAcknowledgementRequest is a request by a seller to a purchaser to confirm the services recorded. |

-continued

| Code | Name | Description |
|---|---|---|
| 0241 | Service Acknowledgement Confirmation | A ServiceAcknowledgementConfirmation is a confirmation (or rejection) of the services recorded. |
| 0250 | Inventory Change Notification | An InventoryChangeNotification is a summery of detailed information about inventory changes in inventory management, which is required for logistics planning. |
| 0251 | Inventory Change Accounting Notification | An InventoryChangeAccountingNotification is a summary of aggregated information about inventory changes in inventory management, which is required for financials. |
| 0252 | Inventory Change Accounting Cancellation Request | An InventoryChangeAccountingCancellationRequest is a request for the full cancellation of posting information previously sent to financials with respect to a goods movement. |
| 0290 | Billing Due Notification | A BillingDueNotification is a notification about billing-relevant data communicated to an application in which the subsequent operative processing of billing takes place. |
| 0291 | Invoicing Due Notification | An InvoicingDueNotification is a notification about invoicing-relevant data communicated to an application in which the operative verification and creation of invoices takes place, and/or in which “self billing” invoices (evaluated receipt settlement) are created. |
| 0292 | Billing Due Cancellation Request | A BillingDueCancellationRequest is a request for the full cancellation of a BillingDueNotification previously sent to billing. |
| 0293 | Invoicing Due Cancellation Request | An InvoicingDueCancellationRequest is a request for the full cancellation of an InvoicingDueNotification previously sent to invoice verification. |
| 0401 | Invoice Request | An InvoiceRequest is a legally binding notice about accounts receivable or accounts payable for delivered goods or provided services - typically a request that payment be made for these goods or services. |
| 0402 | Invoice Confirmation | An InvoiceConfirmation is the response of a recipient of an invoice to the bill-from-party by which the invoice as a whole is confirmed, rejected, or classified as “not yet decided.” |
| 0410 | Invoice Issued Information | An InvoiceIssuedInformation is information about provided services, delivered products, or credit or debit memo request items that have been billed, the items of an invoice that have been used for this, and the extent to which they have been billed. |
| 0411 | Invoice Accounting Notification | An InvoiceAccountingNotification is a notification to financials about information on incoming or outgoing invoices from invoice verification or billing. |
| 0412 | Invoice Accounting Cancellation Request | An InvoiceAccountingCancellationRequest is a request for the full cancellation of posting information previously sent to financials, regarding an incoming or outgoing invoice or credit memo. |
| 0420 | Tax Due Notification | A TaxDueNotification communicates data from tax determination and calculation relevant for tax reports and tax payments to the tax register of a company. |
| 0430 | Payment Due Notification | A PaymentDueNotification notifies an application (Payment), in which subsequent operative processing of payments take place, about due dates (accounts receivable and accounts payable) of business partners. |
| 0450 | Credit Agency Report Query | A CreditAgencyReportQuery is an inquiry to a credit agency concerning the credit report for a business partner. |
| 0451 | Credit Agency Report Response | A CreditAgencyReportResponse is a response from a credit agency concerning the inquiry about the credit report for a business partner. |
| 0452 | Credit Worthiness Query | A CreditWorthinessQuery is an inquiry to credit management concerning the credit worthiness of a business partner. |
| 0453 | Credit Worthiness Response | A CreditWorthinessResponse is a response from credit management concerning the inquiry about the credit worthiness of a business partner. |
| 0454 | Credit Worthiness Change Information | A CreditWorthinessChangeInformation is information about changes of the credit worthiness of a business partner. |
| 0455 | Credit Commitment Query | A CreditCommitmentQuery is an inquiry from credit management concerning existing payment obligations of a business partner. |
| 0456 | Credit Commitment Response | A CreditCommitmentResponse is a response concerning an inquiry from credit management about existing payment obligations of a business partner. |
| 0457 | Credit Commitment Record Notification | A CreditCommitmentRecordNotification is a notice to credit management about existing payment obligations of business partners. |

-continued

| Code | Name | Description |
|---|---|---|
| 0458 | Credit Worthiness Critical Parties Query | A CreditWorthinessCriticalPartiesQuery is an inquiry to credit management about business partners, for which the credit worthiness has been rated as critical. |
| 0459 | Credit Worthiness Critical Parties Response | A CreditWorthinessCriticalPartiesResponse is a response from credit management concerning an inquiry about business partners, for which the credit worthiness has been rated as critical. |
| 0460 | Credit Payment Record Notification | A CreditPaymentRecordNotification is a notice to credit management about the payment behavior of business partners. |
| 0601 | Personnel Time Sheet Information | A PersonnelTimeSheetInformation communicates recorded personnel times and personnel time events from an upstream personnel time recording system to personnel time management. |

From the business document flow, the developers identify the business documents having identical or similar structures, and use these business documents to create the business object model (step 108). The business object model includes the objects contained within the business documents. These objects are reflected as packages containing related information, and are arranged in a hierarchical structure within the business object model, as discussed below.

Methods and systems consistent with the present invention then generate interfaces from the business object model (step 110). The heterogeneous programs use instantiations of these interfaces (called "business document objects" below) to create messages (step 112), which are sent to complete the business transaction (step 114). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages exceed the standards, and thus provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the present invention create consistent interfaces by generating the interfaces from a business object model. Details regarding the creation of the business object model, the generation of an interface from the business object model, and the use of an interface generated from the business object model are provided below.

Figure 5:
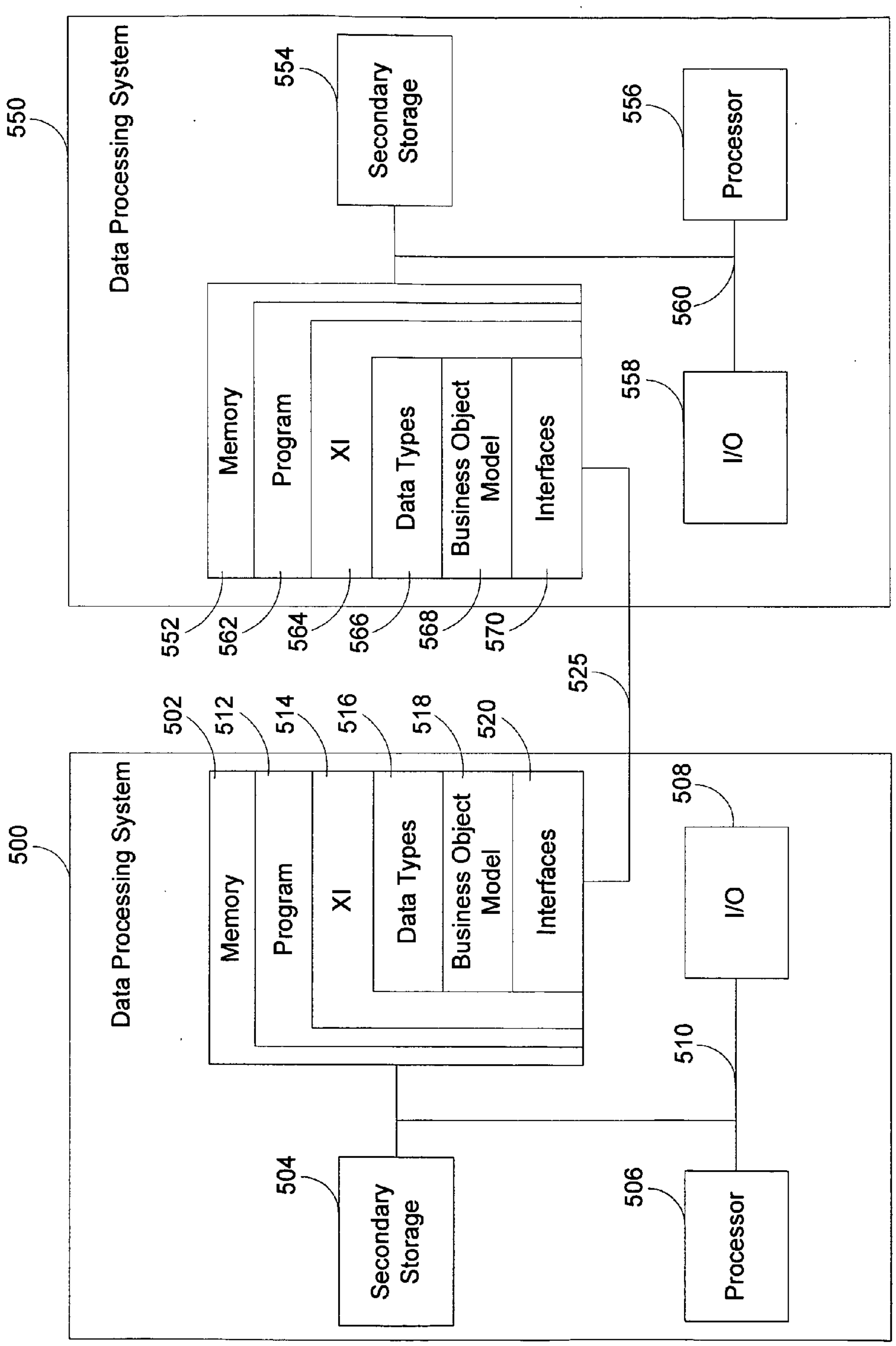
FIG. 5 depicts exemplary data processing systems suitable for practicing methods and systems consistent with the present invention.

FIG. 5 depicts two exemplary data processing systems 500, 550 suitable for practicing methods and systems consistent with the present invention. Data processing system 500 includes a main memory 502, a secondary storage device 504, a processor 506, and an input/output (I/O) device 508. Likewise, data processing system 550 includes a main memory 552, a secondary storage device 554, a processor 556, and an input/output (I/O) device 558. Each data processing system 500, 550 may further comprise standard input devices, such as a keyboard, a mouse or a speech processing means (each not illustrated). The internal components of each data processing system 500, 550 exchange information with one another via system buses 510, 560. The components are standard in most computer systems suitable for use with practicing methods and configuring systems consistent with the present invention. One skilled in the art will recognize that data processing systems 500, 550 may contain additional or different components.

Memory 502 includes program 512, which is an application program that facilitates the transfer of information between business entities. Memory 552 similarly includes program 562, which is an application program that facilitates the transfer of information between business entities. For example, program 512 could be an accounting program that transfers information to program 562, which could be a manufacturing program. Although depicted in two separate data processing systems 500, 550, one having skill in the art will appreciate that programs 512, 562 can reside in the same data processing system, the same computer, and even in the same memory. Each program 512, 562 may comprise or may be included in one or more code sections containing instructions for performing their respective operations. While programs 512, 562 are described as being implemented as software, the present implementation may be implemented as a combination of hardware and software or hardware alone.

Memory 502 also includes an exchange infrastructure ("XI") 514, which is an infrastructure that supports the technical interaction of business processes across heterogeneous system environments. XI centralizes the communication between components within a business entity and between different business entities. If necessary, XI carries out the mapping between the messages. XI is a publicly available product sold by SAP AG, Walldorf, Germany. Similarly, memory 552 includes an XI 564. XI 514, 564 integrates different versions of systems implemented on different platforms (e.g., Java® and ABAP). XI 514, 564 is based on an open architecture, and makes use of open standards, such as XML™ and Java® environments. XI 514, 564 offers services that are useful in a heterogeneous and complex system landscape. In particular, XI 514, 564 offers a runtime infrastructure for message exchange, configuration options for managing business processes and message flow, and options for transforming message contents between sender and receiver systems. XML is a trademark of the Massachusetts Institute of Technology, Institut National de Recherche en Informatique et en Automatique, and Keio University. Java is a registered trademark of Sun Microsystems, Inc. All names used herein may be trademarks or registered trademarks of their respective companies.

XI 514, 564 stores data types 516, 566, a business object model 518, 568, and interfaces 520, 570. The details regarding the business object model are described below. Data types 516, 566 are the building blocks for the business object model 518, 568. The business object model 518, 568 is used to derive consistent interfaces 520, 570. XI 514, 564 allows for the exchange of information from a first company having one computer system to a second company having a second computer system over network connection 525 by using the standardized interfaces 520, 570.

Although not shown in FIG. 5, like all data processing systems, data processing systems 500, 550 have operating systems that control their operations, including the execution of programs 512, 562 by processors 506, 556. Also, although aspects of one implementation consistent with the principles of the present invention are described herein with programs 512, 562 stored in main memories 502, 552, one skilled in the art will appreciate that all or part of systems and methods consistent with the present invention may be stored on or read from other computer-readable media, such as secondary storage devices 504, 554, like hard disks, floppy disks, and CD-ROM; a carrier wave received from a network, such as the Internet; or other forms of ROM or RAM, either currently known or later developed. Finally, although specific components of data processing system 500, 550 have been described, one skilled in the art will appreciate that a data processing system suitable for use with the methods and systems consistent with the present invention may contain additional or different components.

Methods and systems consistent with the present invention provide and use interfaces 520, 570 derived from the business object model 518, 568 suitable for use with more than one business area, for example different departments within a company such as finance, or marketing. Also, they are suitable across industries and across businesses. Interfaces 520, 570 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs.

a) Message Categories

Figure 6:
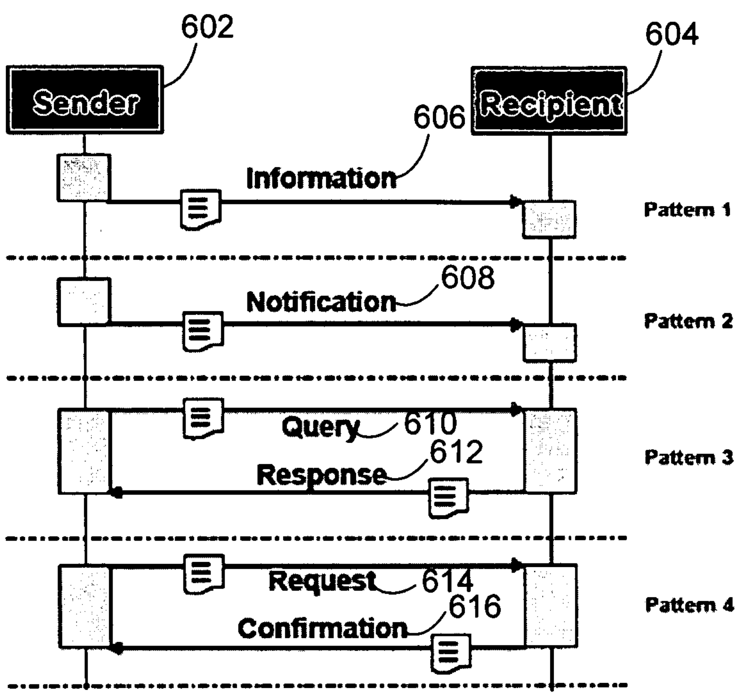
FIG. 6 depicts message categories in accordance with methods and systems consistent with the present invention.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(1) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

(2) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(3) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(4) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(5) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(6) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

Figure 7:
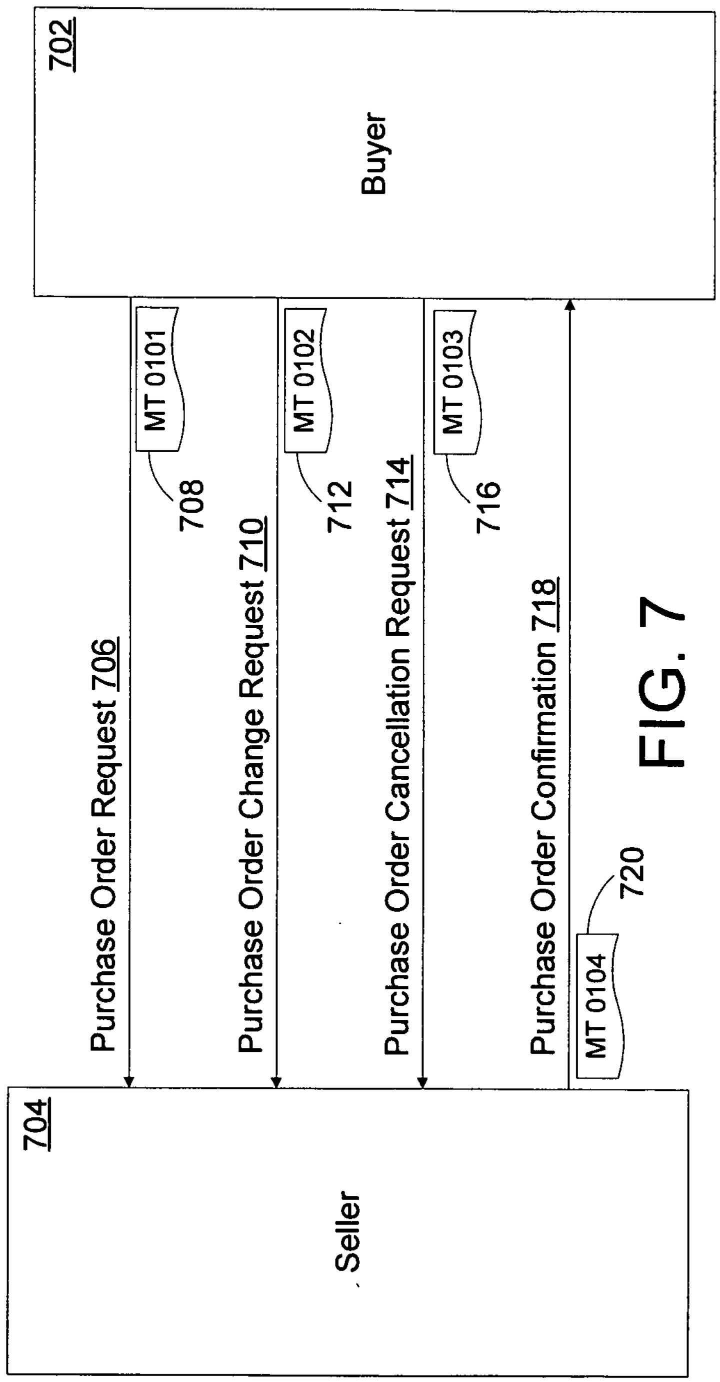
FIG. 7 depicts a message choreography for a purchase order scenario in accordance with methods and systems consistent with the present invention.

For example, the message choreography 700 for a purchase order scenario between buyer 702 and seller 704 is depicted in FIG. 7. A Purchase Order Request Message 706 is the request from the buyer 702 to the seller 704 to deliver goods or render services. The message type 708 of the Purchase Order Request Message 706 is 0101, as defined above. The Purchase Order Change Request Message 710 requests a change of a previous purchase order request or purchase order change request message. The message type 712 of the Purchase Order Change Request Message 710 is 0102. The Purchase Order Cancellation Request Message 714 is the cancellation of the request of the buyer 702 to the seller 704 to deliver goods or render services. The message type 716 of the Purchase Order Cancellation Request Message 714 is 0103. The Purchase Order Confirmation Message 718 is a confirmation, a partial confirmation, or a change with respect to the delivery of goods or the rendering of services that were requested or cancelled. The message type 720 of the Purchase Order Confirmation Message 718 is 0104.

Illustrative message choreographies that cover a number of transactions are presented below.

(1) Master Data Management

Figure 8:
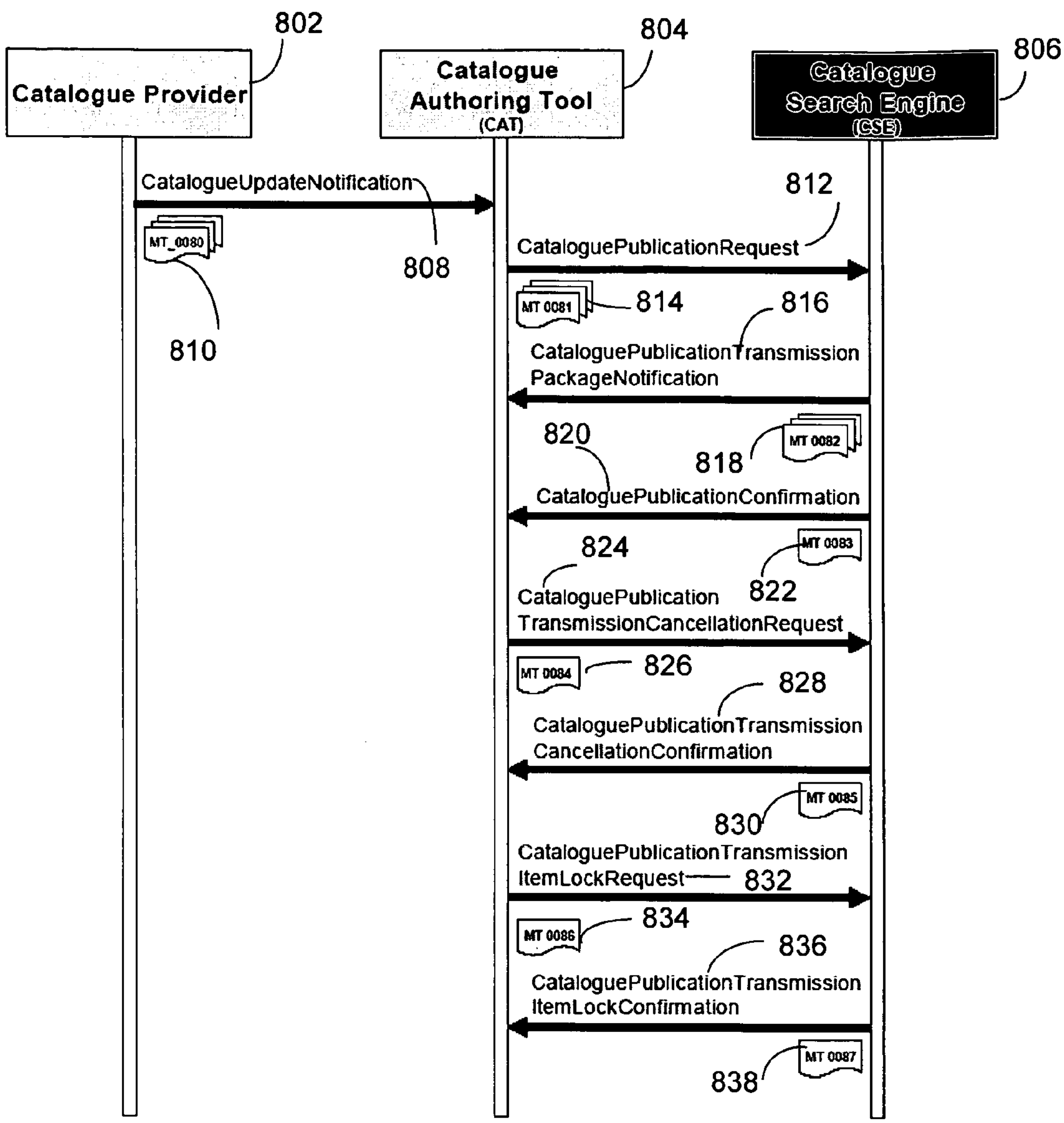
FIG. 8 depicts a message choreography of a Master Data Management in accordance with methods and systems consistent with the present invention.

FIG. 8 depicts the message choreography of a Master Data Management. The Master Data Management choreography involves three components: a Catalogue Provider 802, a Catalogue Authoring Tool (CAT) 804, and a Catalogue Search Engine (CSE) 806. The Catalogue Provider 802 sends a CatalogueUpdateNotification message 808 to the CAT 804. The message type 810 of the CatalogueUpdateNotification message 808 is 0080, i.e., a notice from a catalogue provider to an interested party about a new catalogue transmitted in the message or about changes to an existing catalogue transmitted in the message. The message type 810 can be divided into multiple messages. The CAT 804 then sends a CataloguePublicationRequest message 812 to the CSE 806. The message type 814 of the CataloguePublicationRequest message 812 is 0081, i.e., a request from catalogue authoring to the Catalogue Search Engine (the publishing system) to publish a new or changed catalogue or to delete an already published catalogue (the catalogue is possibly split into several transmission packages). The message type 814 also can be divided into multiple messages.

The CSE 806 sends a CataloguePublicationTransmissionPackageNotification message 816 to the CAT 804. The message type 818 of the CataloguePublicationTransmissionPackageNotification message 816 is 0082, i.e., the notification of the Catalogue Search Engine (the publishing system) to Catalogue Authoring about a package of a catalogue publication transmission and information about the reception of this package and the validity of its content. The message type 818 can be divided into multiple messages.

The CSE 806 sends a CataloguePublicationConfirmation message 820 to the CAT 804. The message type 822 of the CataloguePublicationConfirmation message 820 is 083, i.e., the confirmation of the Catalogue Search Engine (the publishing system) to the Catalogue Authoring whether the publication or deletion of a Catalogue requested by a CataloguePublicationRequest 812 was successful or not.

The CAT 804 sends a CataloguePublicationTransmissionCancellationRequest message 824 to the CSE 806. The message type 826 of the CataloguePublicationTransmissionCancellationRequest message 824 is 0084, i.e., the request of Catalogue Authoring to Catalogue Search Engine (the publishing system) to cancel the transmission of a Catalogue and to restore an earlier published state (if such exists) of the Catalogue. Moreover, no more packages are sent for this transmission.

The CSE 806 sends a CataloguePublicationTransmissionCancellationConfirmation message 828 to the CAT 804. The message type 830 of the CataloguePublicationTransmissionCancellationConfirmation message 828 is 0085, i.e., the confirmation of Catalogue Search Engine (the publishing system) whether the transmission of a Catalogue has been cancelled successfully and an earlier published state of this catalogue (if such exists) has been restored or not.

The CAT 804 sends a CataloguePublicationTransmissionItemLockRequest message 832 to the CSE 806. The message type 834 of the CataloguePublicationTransmissionItemLockRequest message 832 is 0086, i.e., the request of Catalogue Authoring to lock single items of the catalogue contained in the catalogue publication transmission.

The CSE 806 sends a CataloguePublicationTransmissionItemLockConfirmation message 836 to the CAT 804. The message type 838 of the CataloguePublicationTransmissionItemLockConfirmation message 836 is 0087, i.e., the confirmation of Catalogue Search Engine (the publishing system) to Catalogue Authoring whether single items of the catalogue contained in the catalogue publication transmission could be locked or not. If an item of the catalogue is locked and the catalogue is not yet published, the items must not be published. If the catalogue is already published, the publication of these items must be revoked.

Figure 9:
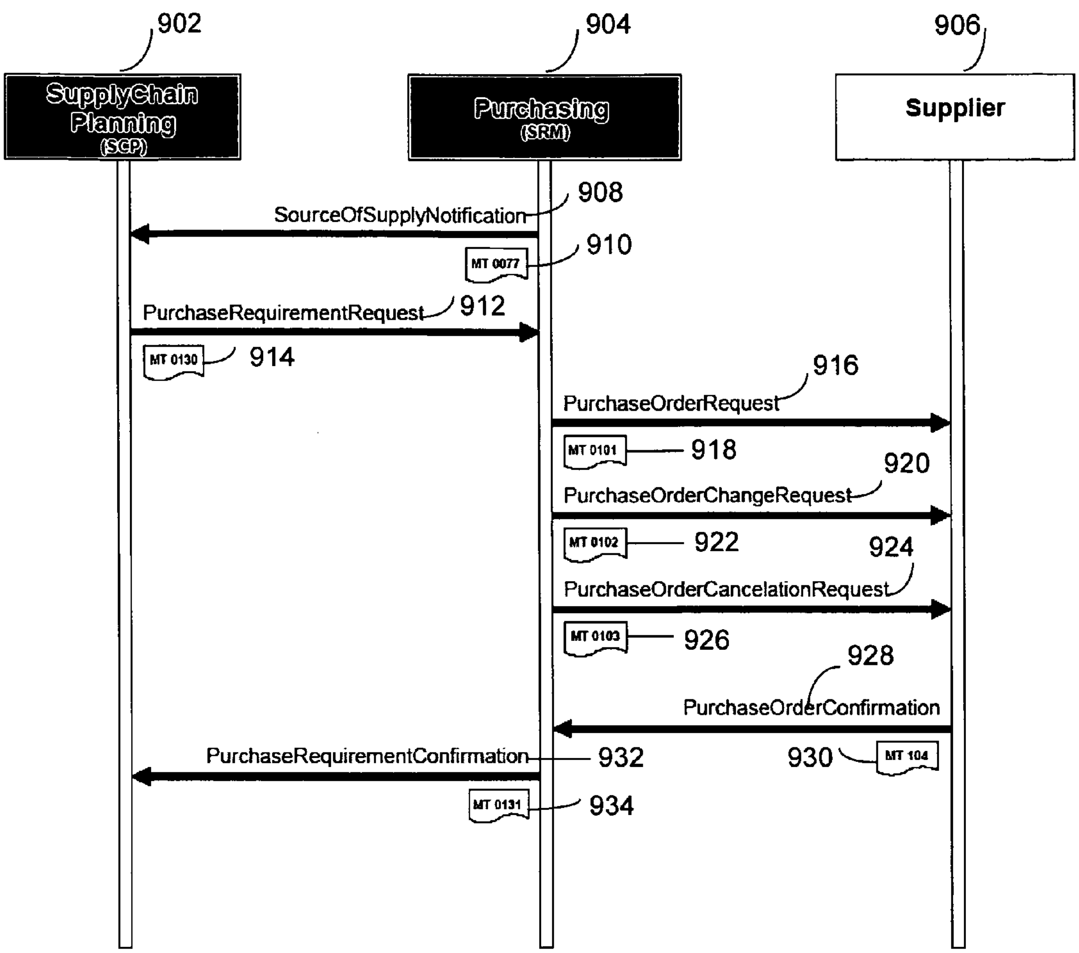
FIG. 9 depicts a message choreography of a Source of Supply, Purchase Requirement, and Purchase Order in accordance with methods and systems consistent with the present invention.

(2) Purchasing and Sales (a) Source of Supply, Purchase Requirement, and Purchase Order FIG. 9 depicts the message choreography of a Source of Supply, Purchase Requirement, and Purchase Order. The Source of Supply, Purchase Requirement, and Purchase Order choreography involves three components: Supply Chain Planning (SCP) 902, Purchasing (SRM) 904, and a Supplier 906.

The SRM 904 sends a SourceOfSupplyNotification message 908 to the SCP 902. The message type 910 of the SourceOfSupplyNotification message 908 is 0077, i.e., a notice to Supply Chain Planning about available sources of supply.

The SCP 902 sends a PurchaseRequirementRequest message 912 to the SRM 904. The message type 914 of the PurchaseRequirementRequest message 912 is 0130, i.e., a request from a requestor to a purchaser to (externally) procure products (materials, services) (external procurement).

The SRM 904 sends a PurchaseOrderRequest message 916 to the Supplier 906. The message type 918 of the PurchaseOrderRequest message 916 is 0101, i.e., a request from a purchaser to a seller to deliver goods or provide services.

The SRM 904 sends a PurchaseOrderChangeRequest message 920 to the Supplier 906. The message type 922 of the PurchaseOrderChangeRequest message 920 is 0102, i.e., a change to a purchaser's request to the seller to deliver goods or provide services.

The SRM 904 sends a PurchaseOrderCancellationRequest message 924 to the Supplier 906. The message type 926 of the PurchaseOrderCancellationRequest message 924 is 0103, i.e., the cancellation of a purchaser's request to the seller to deliver goods or provide services.

The Supplier 906 sends a PurchaseOrderConfirmation message 928 to the SRM 904. The message type 930 of the PurchaseOrderConfirmation message 928 is 0104, i.e., a confirmation, partial confirmation, or change from a seller to the purchaser, regarding the requested delivery of goods or provision of services.

The SRM 904 sends a PurchaseRequirementConfirmation message 932 to the SCP 902. The message type 934 of the PurchaseRequirementConfirmation message 932 is 0131, i.e., a notice from the purchaser to the requestor about the degree of fulfillment of a requirement.

(b) Product Demand, Product Forecast and Product Activity

Figure 10:
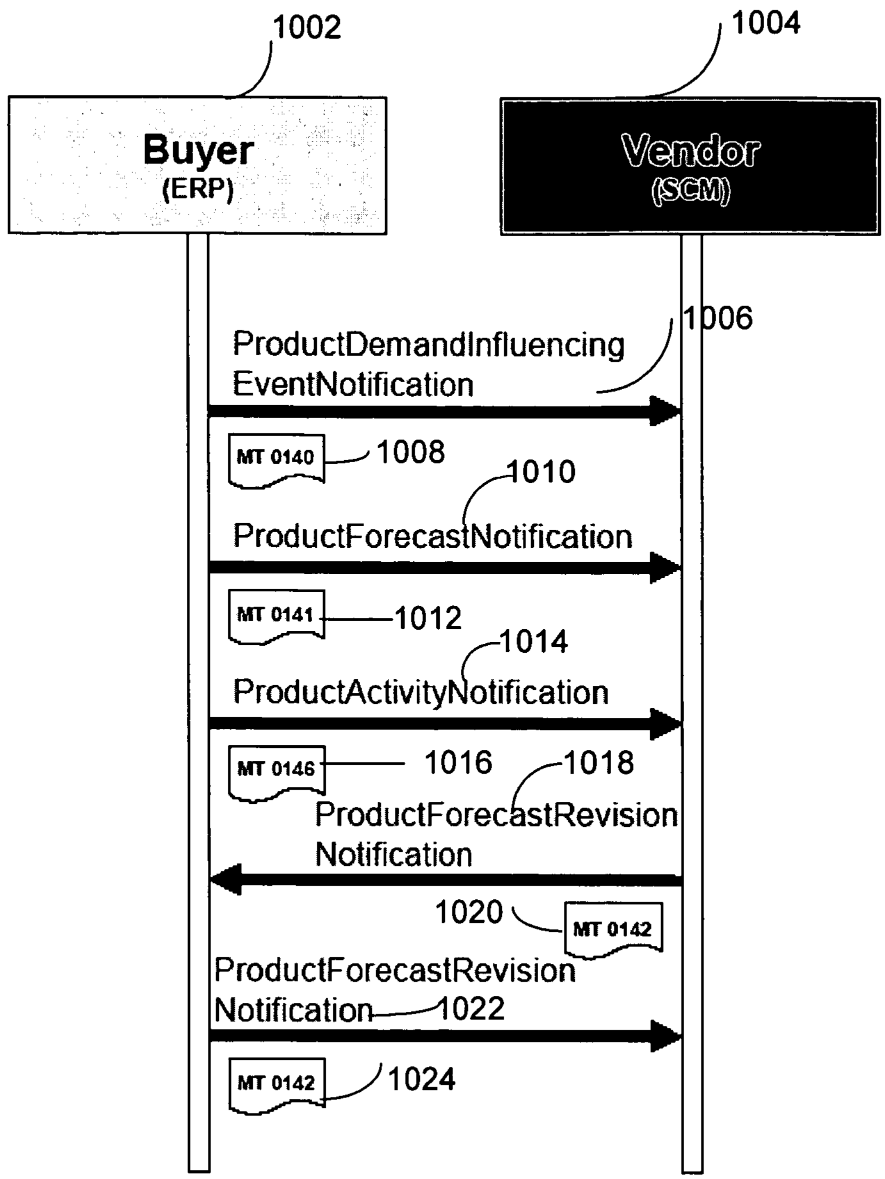
FIG. 10 depicts a message choreography of a Product Demand, Product Forecast and Product Activity in accordance with methods and systems consistent with the present invention.

FIG. 10 depicts the message choreography of a Product Demand, Product Forecast and Product Activity. The Product Demand, Product Forecast and Product Activity choreography involves two components: a Buyer (ERP) 1002 and a Vendor (SCM) 1004.

The Buyer 1002 sends a ProductDemandInfluencingEventNotification message 1006 to the Vendor 1004. The message type 1008 of the ProductDemandInfluencingEventNotification message 1006 is 0140, i.e., a notification about an event which influences the supply or demand of products.

The Buyer 1002 sends a ProductForecastNotification message 1010 to the Vendor 1004. The message type 1012 of the ProductForecastNotification message 1010 is 0141, i.e., a notification about future product demands (forecasts).

The Buyer 1002 sends a ProductActivityNotification message 1014 to the Vendor 1004. The message type 1016 of the ProductActivityNotification message 1014 is 0145, i.e., a message which communicates product-related activities of a buyer to a vendor. Based on this, the vendor can perform supply planning for the buyer.

The Vendor 1004 sends a ProductForecastRevisionNotification message 1018 to the Buyer 1002. The message type 1020 of the ProductForecastRevisionNotification message 1018 is 0142, i.e., a notification about the revision of future product demands (forecasts).

The Buyer 1002 sends the ProductForecastRevisionNotification message 1022 to the Vendor 1004. The message type 1024 of the ProductForecastRevisionNotification message 1022 is 0142.

(c) RFQ and Quote

Figure 11:
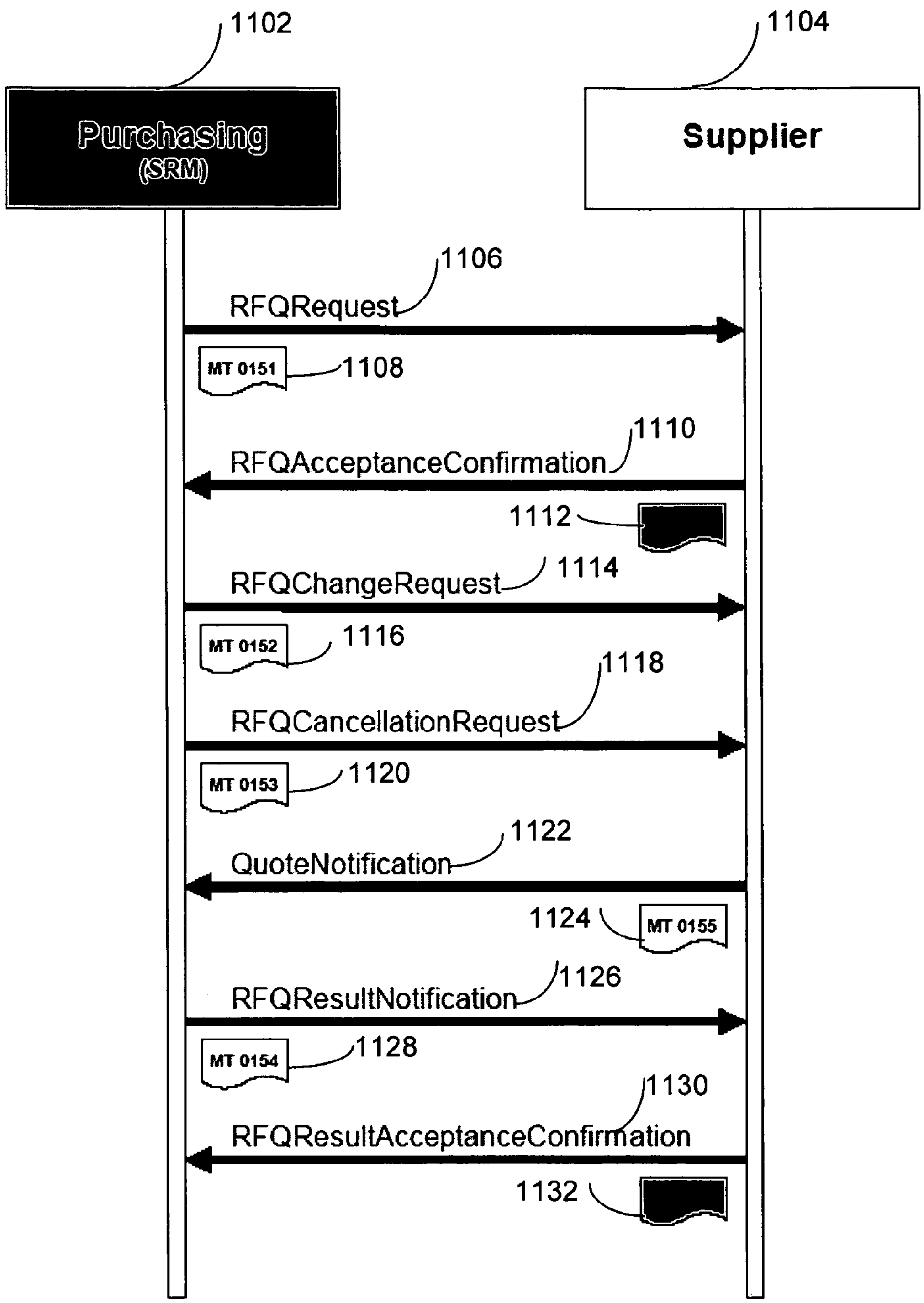
FIG. 11 depicts a message choreography of a RFQ and Quote in accordance with methods and systems consistent with the present invention.

FIG. 11 depicts the message choreography of a RFQ and Quote. The RFQ and Quote choreography involves two components: Purchasing (SRM) 1102 and a Supplier 1104.

The SRM 1102 sends a RFQRequest message 1106 to the Supplier 1104. The message type 1108 of the RFQRequest message 1106 is 0151, i.e., the request from a purchaser to a bidder to participate in a request for quotation for a product.

The Supplier 1104 sends a RFQAcceptanceConfirmation message 1110 to the SRM 1102. The message type of the RFQAcceptanceConfirmation message 1110 can be any conventional RFQ Acceptance Confirmation 1112.

The SRM 1102 sends a RFQChangeRequest message 1114 to the Supplier 1104. The message type 1116 of the RFQChangeRequest message 1114 is 0152, i.e., a change to the purchaser's request for a bidder to participate in the request for quotation for a product.

The SRM 1102 sends a RFQCancellationRequest message 1118 to the Supplier 1104. The message type 1120 of the RFQCancellationRequest message 1118 is 0153, i.e., a cancellation by the purchaser of a request for quotation for a product.

The Supplier 1104 sends a QuoteNotification message 1122 to the SRM 1102. The message type 1124 of the QuoteNotification message 1122 is 0155, i.e., the quote of a bidder communicated to a purchaser concerning the request for quotation for a product by the purchaser.

The SRM 1102 sends a RFQResultNotification message 1126 to the Supplier 1104. The message type 1128 of the RFQResultNotification message 1126 is 0154, i.e., a notification by a purchaser to a bidder about the type and extent of the acceptance of a quote or about the rejection of the quote.

The Supplier 1104 sends a RFQResultAcceptanceConfirmation message 1130 to the SRM 1102. The message type of the RFQResultAcceptanceConfirmation message 1130 can be any conventional RFQ Result Acceptance Confirmation 1132.

(d) Purchasing

Figure 12:
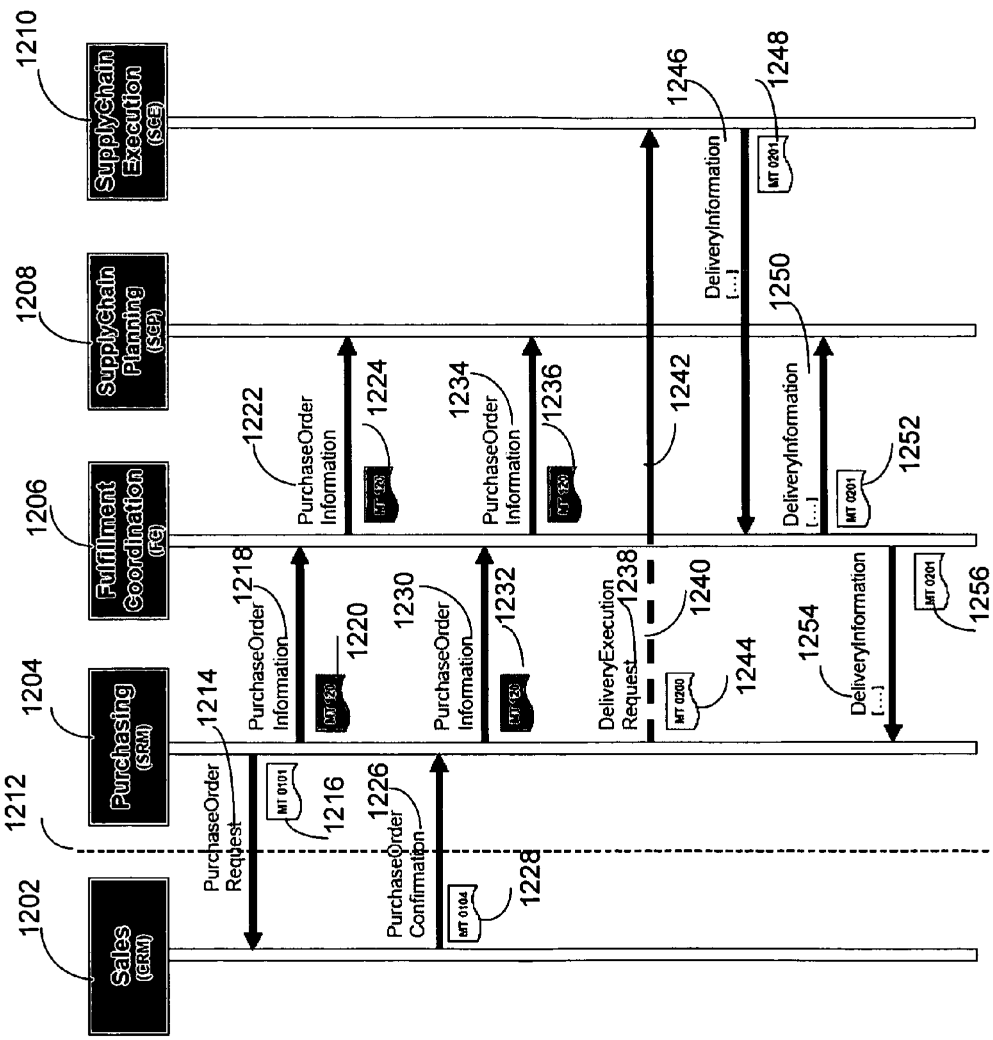
FIG. 12 depicts a message choreography of Purchasing in accordance with methods and systems consistent with the present invention.

FIG. 12 depicts the message choreography of Purchasing. The Purchasing choreography involves five components: Sales (CRM) 1202, Purchasing (SRM) 1204, Fulfillment Coordination (FC) 1206, Supply Chain Planning (SCP) 1208, and Supply Chain Execution (SCE) 1210. Line 1212 denotes a company border. Thus, one company includes Sales 1202, while another company includes SRM 1204, FC 1206, SCP 1208, and SCE 1210.

The SRM 1204 sends a PurchaseOrderRequest message 1214 to the CRM 1202. The message type 1216 of the PurchaseOrderRequest message 1214 is 0101, i.e., a request from a purchaser to a seller to deliver goods or provide services.

The SRM 1204 sends a PurchaseOrderInformation message 1218 to the FC 1206. The message type 1220 of the PurchaseOrderInformation message 1218 is 0120, i.e., information from a purchasing system for interested recipients about the current state of a purchase order when creating or changing a purchase order, confirming a purchase order or canceling a purchase order.

The FC 1206 sends the PurchaseOrderInformation message 1222 to the SCP 1208. The message type 1224 of the PurchaseOrderInformation message 1222 is message type 0120.

The CRM 1202 sends a PurchaseOrderConfirmation message 1226 to the SRM 1204. The message type 1228 of the PurchaseOrderConfirmation message 1226 is 0104, i.e., a confirmation, partial confirmation, or change from a seller to the purchaser, regarding the requested delivery of goods or provision of services.

The SRM 1204 sends a PurchaseOrderInformation message 1230 to the FC 1206. The message type 1232 of the PurchaseOrderInformation message 1230 is 0120, described above.

The FC 1206 sends the PurchaseOrderInformation message 1234 to the SCP 1208. The message type 1236 of the PurchaseOrderInformation message 1234 is 0120.

The FC 1206 sends a DeliveryExecutionRequest message 1238 to the SCE 1210, as depicted by line 1242. Alternatively, the SRM 1204 may send the DeliveryExecutionRequest message 1238 to the SCE 1210, as depicted by broken line 1240. The message type 1244 of the DeliveryExecutionRequest message 1238 is 0200, i.e., a request to a warehouse or supply chain execution to prepare and execute the outbound delivery of goods or the acceptance of an expected or announced inbound delivery.

The SCE 1210 sends a DeliveryInformation message 1246 to the FC 1206. The message type 1248 of the DeliveryInformation message 1246 is 0201, i.e., a message about the creation, change, and execution status of a delivery.

The FC 1206 sends a DeliveryInformation message 1250 to the SCP 1208. The message type 1252 of the DeliveryInformation message is 0201.

The FC 1206 sends a DeliveryInformation message 1254 to the SRM 1204. The message type 1256 of the DeliveryInformation message 1254 is 0201.

(e) Sales

Figure 13:
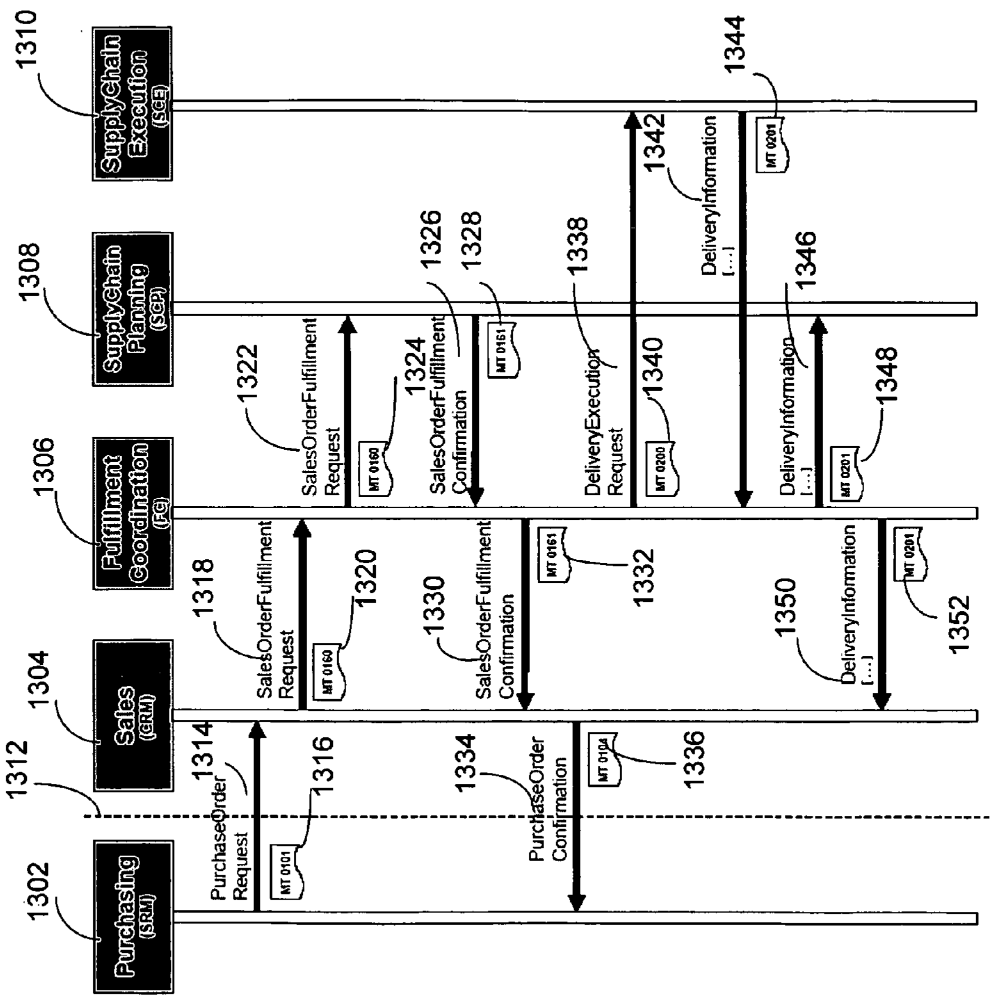
FIG. 13 depicts a message choreography of Sales in accordance with methods and systems consistent with the present invention.

FIG. 13 depicts the message choreography of Sales. The Sales choreography involves five components: Purchasing (SRM) 1302, Sales (CRM) 1304, Fulfillment Coordination (FC) 1306, Supply Chain Planning (SCP) 1308, and Supply Chain Execution (SCE) 1310. Line 1312 denotes a company border. Thus, one company includes SRM 1302, while another company includes CRM 1304, FC 1306, SCP 1308, and SCE 1310.

The SRM 1302 sends a PurchaseOrderRequest message 1314 to the CRM 1304. The message type 1316 of the PurchaseOrderRequest message 1314 is 0101, i.e., a request from a purchaser to a seller to deliver goods or provide services.

The CRM 1304 sends a SalesOrderFulfillmentRequest message 1318 to the FC 1306. The message type 1320 of the SalesOrderFulfillmentRequest message 1318 is 0160, i.e., a request (or change or cancellation of such a request) from a selling component to a procuring component, to fulfill the logistical requirements (for example, available-to-promise check, scheduling, requirements planning, procurement, and delivery) of a sales order.

The FC 1306 sends the SalesOrderFulfillmentRequest message 1322 to the SCP 1308. The message type 1324 of the SalesOrderFulfillmentRequest message 1322 is 0160.

The SCP 1308 sends a SalesOrderFulfillmentConfirmation message 1326 to the FC 1306. The message type 1328 of the SalesOrderFulfillmentConfirmation message 1326 is 0161, i.e., a confirmation, partial confirmation or change from the procuring component to the selling component, regarding a sales order with respect to which procurement has been requested.

The FC 1306 sends the SalesOrderFulfillmentConfirmation message 1330 to the CRM 1304. The message type 1332 of the SalesOrderFulfillmentConfirmation message 1330 is 0161.

The CRM 1304 sends a PurchaseOrderConfirmation message 1334 to the SRM 1302. The message type 1336 of the PurchaseOrderConfirmation message 1334 is 0104, i.e., a confirmation, partial confirmation, or change from a seller to the purchaser, regarding the requested delivery of goods or provision of services.

The FC 1306 sends a DeliveryExecutionRequest message 1338 to the SCE 1310. The message type 1340 of the DeliveryExecutionRequest message 1338 is 0200, i.e., a request to a warehouse or supply chain execution to prepare and execute the outbound delivery of goods or the acceptance of an expected or announced inbound delivery.

The SCE 1310 sends a DeliveryInformation message 1344 to the FC 1306. The message type 1346 of the DeliveryInformation message 1344 is 0201, i.e., a message about the creation, change, and execution status of a delivery.

The FC 1306 sends the DeliveryInformation message 1348 to the SCP 1308. The message type 1350 of the DeliveryInformation message 1348 is 0201, i.e., a message about the creation, change, and execution status of a delivery.

The FC 1306 also sends the DeliveryInformation message 1352 to the CRM 1304. The message type 1354 of the DeliveryInformation message 1352 is 0201.

(f) Vendor Managed Inventory/Responsive Replenishment

Figure 14:
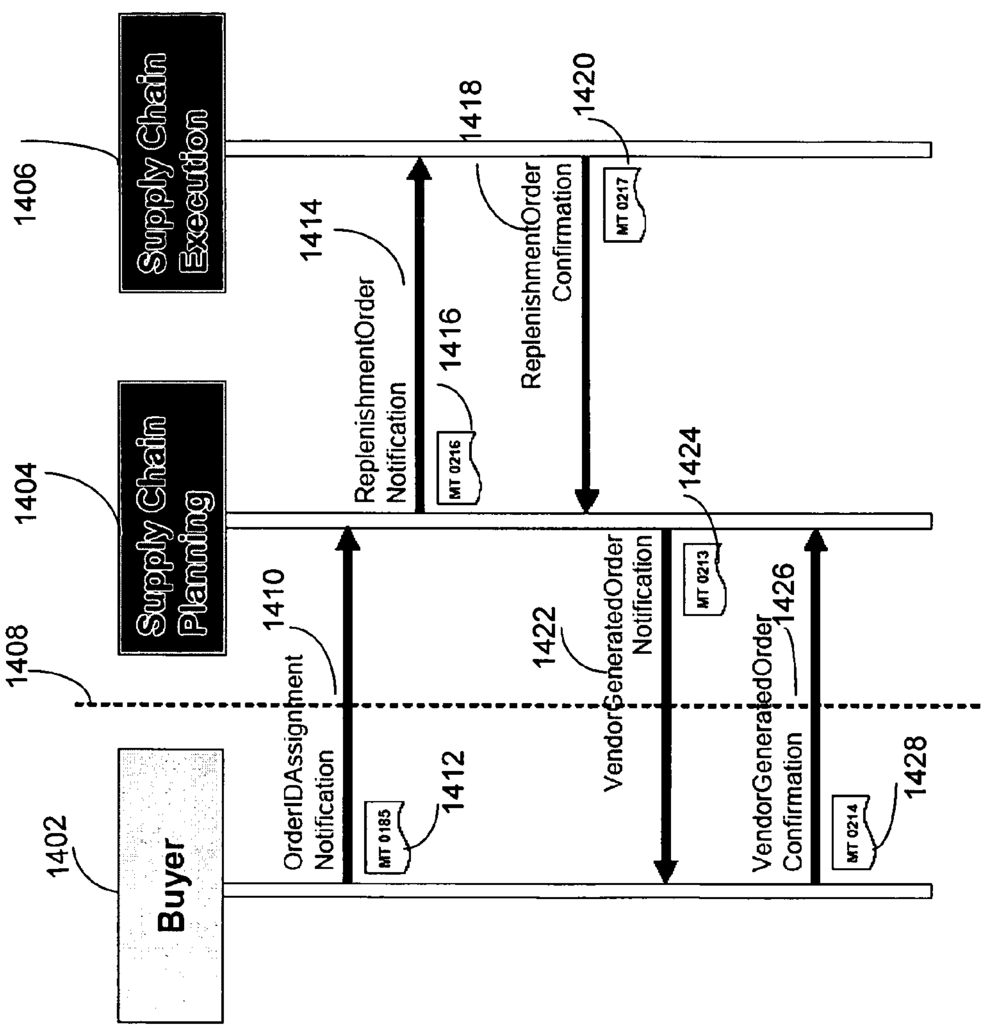
FIG. 14 depicts a message choreography of a Vendor Managed Inventory/Responsive Replenishment in accordance with methods and systems consistent with the present invention.

FIG. 14 depicts the message choreography of a Vendor Managed Inventory/Responsive Replenishment. The Vendor Managed Inventory/Responsive Replenishment choreography involves three components: a Buyer 1402, Supply Chain Planning 1404, and Supply Chain Execution 1406. Line 1408 denotes a company border. Thus, one company includes Buyer 1402, while another company includes Supply Chain Planning 1404 and Supply Chain Execution 1406.

The Buyer 1402 sends an OrderIDAssignmentNotification message 1410 to Supply Chain Planning 1404. The message type 1412 of the OrderIDAssignmentNotification message 1410 is 0185, i.e., a message that allows a buyer to assign a vendor order numbers for identifying "purchase orders generated by the vendor."

Supply Chain Planning 1404 sends a ReplenishmentOrderNotification message 1414 to Supply Chain Execution 1406. The message type 1416 of the ReplenishmentOrderNotification message 1414 is 0216, i.e., a message that is used by Logistics Planning (SCP, vendor) to transfer a replenishment order planned for a customer/buyer to Logistics Execution (SCE, vendor) in order to trigger further processing for the order and prepare the outbound delivery.

Supply Chain Execution 1406 sends a ReplenishmentOrderConfirmation message 1418 to Supply Chain Planning 1404. The message type 1420 of the ReplenishmentOrderConfirmation message 1418 is 0217, i.e., a message that is used by Logistics Execution (SCE, vendor) to confirm to Logistics Planning (SCP, vendor) that a replenishment order that is planned for a customer/buyer can be fulfilled.

Supply Chain Planning 1404 sends a VendorGeneratedOrderNotification message 1422 to the Buyer 1402. The message type 1424 of the VendorGeneratedOrderNotification message 1422 is 0213, i.e., a message that is used by a vendor/seller to transfer the replenishment order that he has initiated and planned to a customer/buyer so that the latter can create a purchase order. The notification sent by the vendor/seller to the customer/buyer regarding the planned replenishment order can be regarded as a "purchase order generated by the seller."

The Buyer 1402 sends a VendorGeneratedOrderConfirmation message 1426 to Supply Chain Planning 1404. The message type 1428 of the VendorGeneratedOrderConfirmation message 1426 is 0214, i.e., VendorGeneratedOrderConfirmation is the confirmation from a customer/buyer that a purchase order has been created for the replenishment order initiated and planned by his vendor/seller. This confirmation from the customer/buyer for a "purchase order generated by the seller" can be regarded as a "purchase order" in the traditional sense, which, in turn, triggers the corresponding fulfillment process at the vendor/seller.

Figure 15:
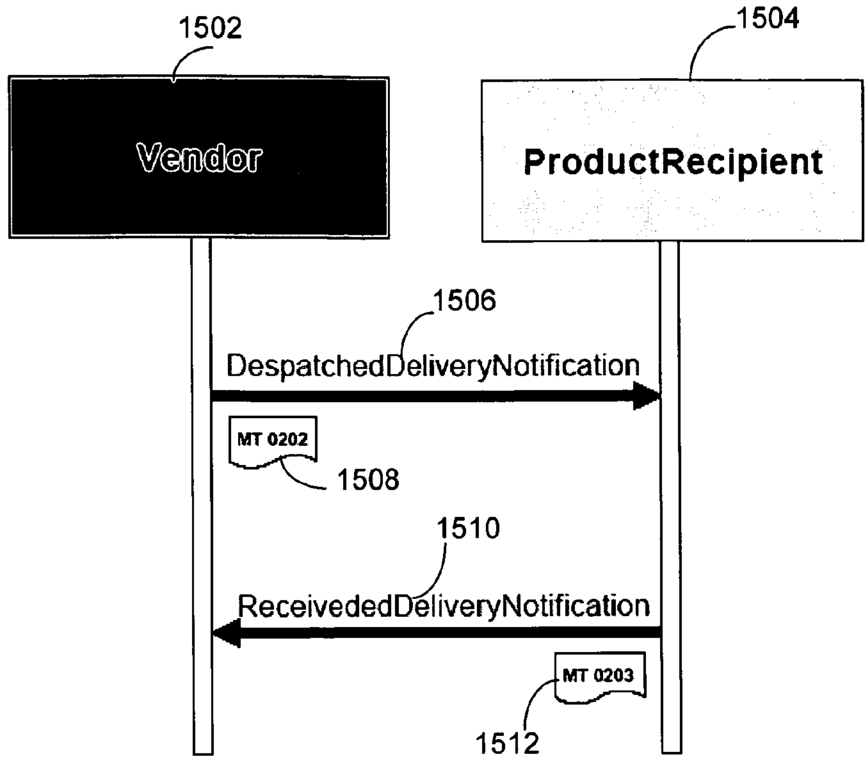
FIG. 15 depicts a message choreography of an Advanced Shipment Notification and Proof of Delivery in accordance with methods and systems consistent with the present invention.

(3) Delivery and Goods Movement (a) Advanced Shipment Notification and Proof of Delivery FIG. 15 depicts the message choreography of an Advanced Shipment Notification and Proof of Delivery. The Advanced Shipment Notification and Proof of Delivery choreography involves two components: a Vendor 1502 and a Product Recipient 1504.

The Vendor 1502 sends a DespatchedDeliveryNotification message 1506 to the Product Recipient 1504. The message type 1508 of the DespatchedDeliveryNotification message 1506 is 0202, i.e., a notification communicated to a product recipient about the planned arrival, pickup, or issue date of a ready-to-send delivery, including details about the content of the delivery.

The Product Recipient 1504 sends a ReceivedDeliveryNotification message 1510 to the Vendor 1502. The message type 1512 of the ReceivedDeliveryNotification message 1510 is 0203, i.e., a notification communicated to a vendor about the arrival of the delivery sent by him to the product recipient, including details about the content of the delivery.

(b) Service Acknowledgement

Figure 16:
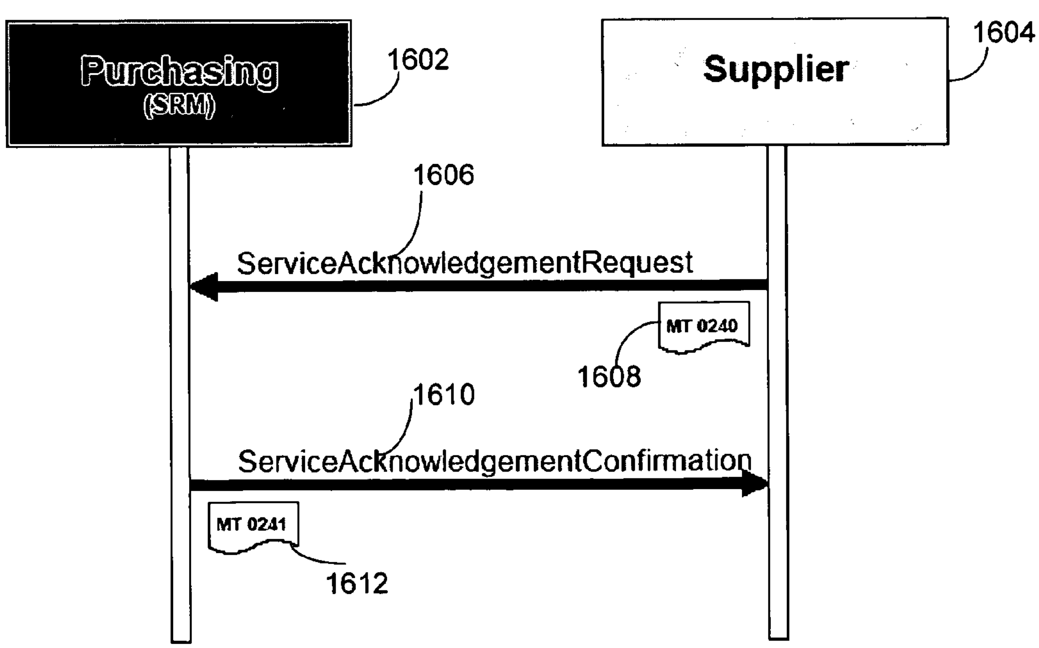
FIG. 16 depicts a message choreography of a Service Acknowledgement in accordance with methods and systems consistent with the present invention.

FIG. 16 depicts the message choreography of a Service Acknowledgement. The Service Acknowledgement choreography involves two components: Purchasing (SRM) 1602 and a Supplier 1604.

The Supplier 1604 sends a ServiceAcknowledgementRequest message 1606 to the SRM 1602. The message type 1608 of the ServiceAcknowledgementRequest message 1606 is 0240, i.e., a request by a seller to a purchaser to confirm the services recorded.

The SRM 1602 sends a ServiceAcknowledgementConfirmation message 1610 to the Supplier 1604. The message type 1612 of the ServiceAcknowledgementConfirmation message 1610 is 0241, i.e., a confirmation (or rejection) of the services recorded.

(c) Inventory Change

Figure 17:
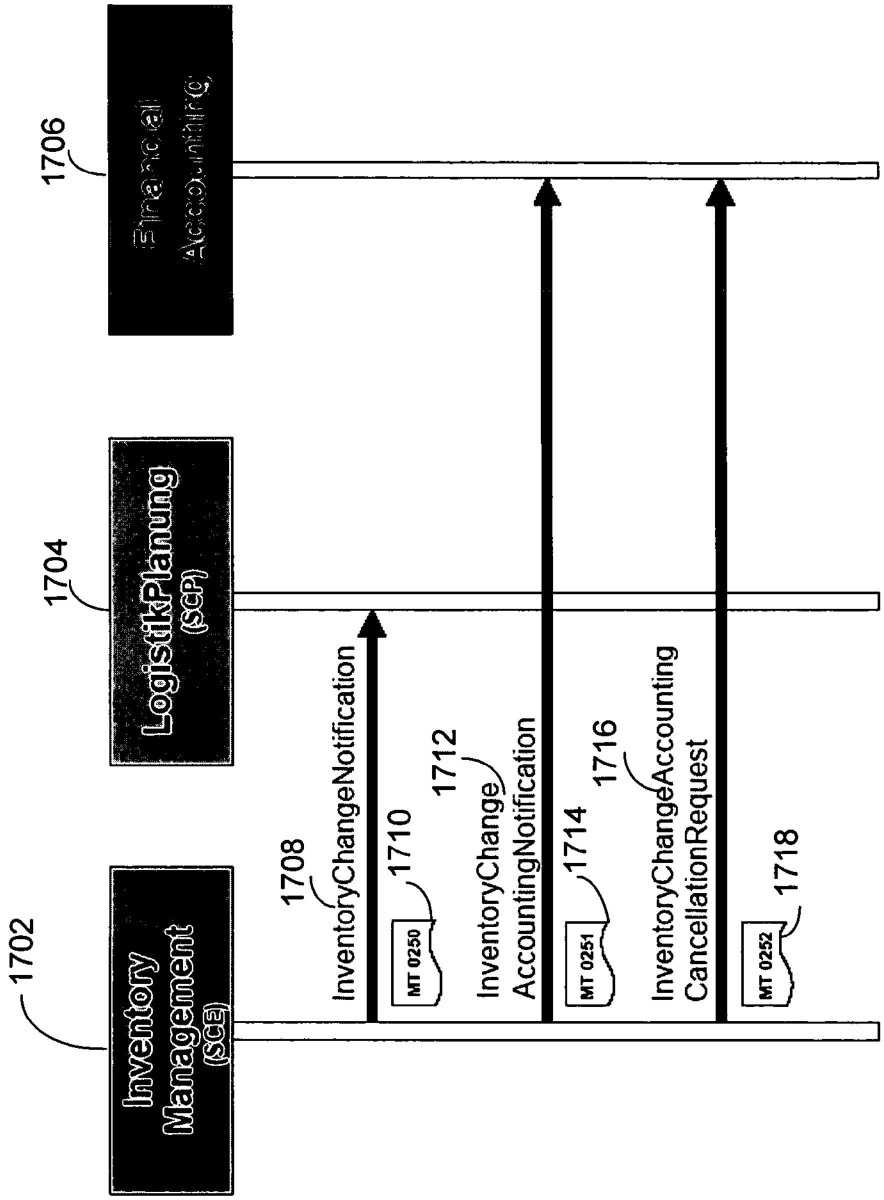
FIG. 17 depicts a message choreography of an Inventory Change in accordance with methods and systems consistent with the present invention.

FIG. 17 depicts the message choreography of an Inventory Change. The Inventory Change choreography involves three components: Inventory Management (SCE) 1702, Logistic Planning (SCP) 1704 and Financial Accounting 1706.

The SCE 1702 sends an InventoryChangeNotification message 1708 to the SCP 1704. The message type 1710 of the InventoryChangeNotification message 1708 is 0250, i.e., a summery of detailed information about inventory changes in inventory management, which is required for logistics planning.

The SCE 1702 sends an InventoryChangeAccountingNotification message 1712 to Financial Accounting 1706. The message type 1714 of the InventoryChangeAccountingNotification message 1712 is 0251, i.e., a summary of aggregated information about inventory changes in inventory management, which is required for financials.

The SCE 1702 sends an InventoryChangeAccountingCancellationRequest message 1716 to Financial Accounting 1706. The message type 1718 of the InventoryChangeAccountingCancellationRequest message 1716 is 0252, i.e., a request for the full cancellation of posting information previously sent to financials with respect to a goods movement.

(4) Invoice and Payment and Financials (a) Billing Due

Figure 18:
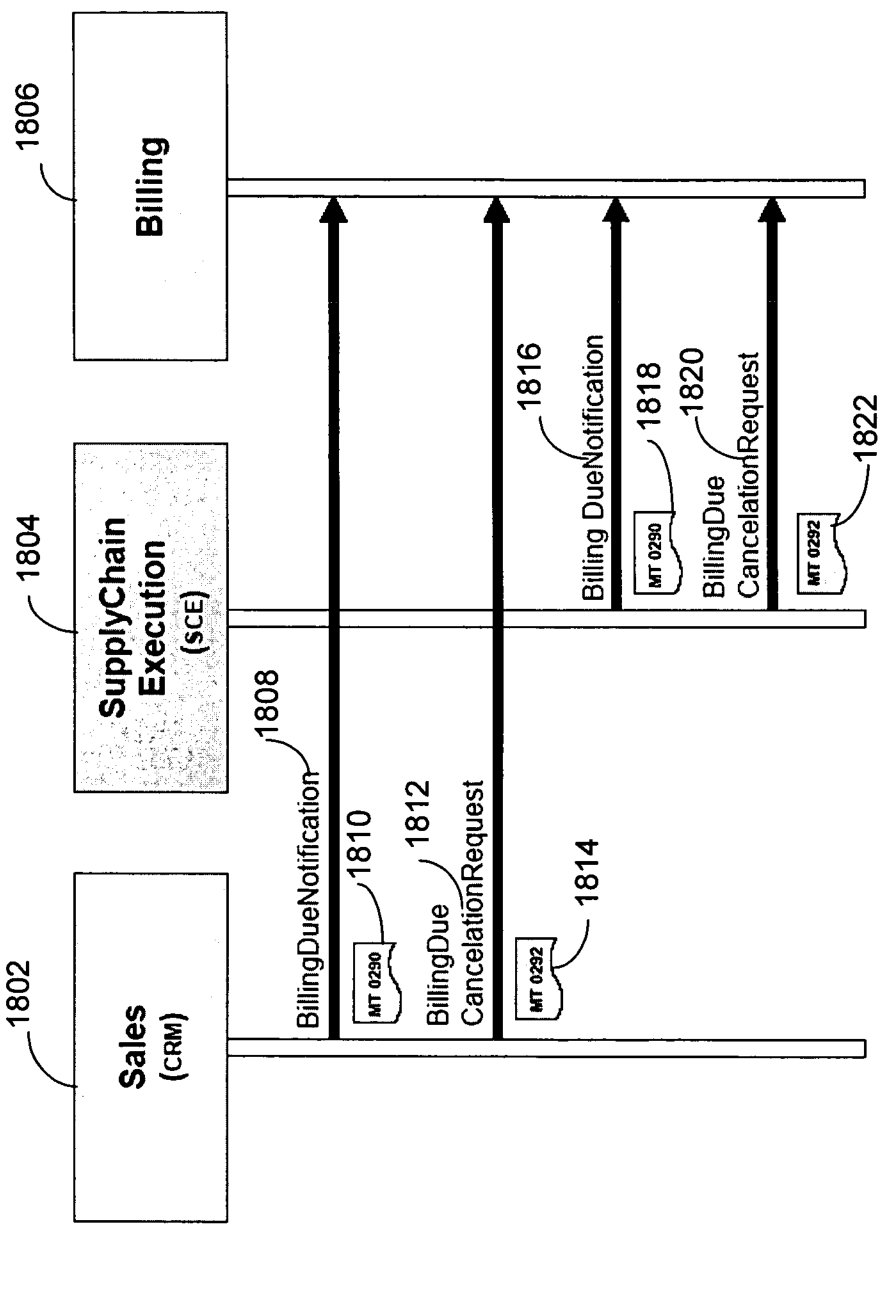
FIG. 18 depicts a message choreography of Billing Due in accordance with methods and systems consistent with the present invention.

FIG. 18 depicts the message choreography of Billing Due. The Billing Due choreography involves three components: Sales (CRM) 1802, Supply Chain Execution (SCE) 1804, and Billing 1806.

The CRM 1802 sends a BillingDueNotification message 1808 to Billing 1806. The message type 1810 of the BillingDueNotification message 1808 is 0290, i.e., a notification about billing-relevant data communicated to an application in which the subsequent operative processing of billing takes place.

The CRM 1802 sends a BillingDueCancellationRequest message 1812 to Billing 1806. The message type 1814 of the BillingDueCancellationRequest message 1812 is 0292, i.e., a request for the full cancellation of a BillingDueNotification previously sent to billing.

The SCE 1804 sends a BillingDueNotification message 1816 to Billing 1806. The message type 1818 of the BillingDueNotification message 1816 is 0290, i.e., a notification about billing-relevant data communicated to an application in which the subsequent operative processing of billing takes place.

The SCE 1804 sends a BillingDueCancellationRequest message 1820 to Billing 1806. The message type 1822 of the BillingDueCancellationRequest message 1820 is 0292, i.e., a request for the full cancellation of a BillingDueNotification previously sent to billing.

(b) Invoicing Due

Figure 19:
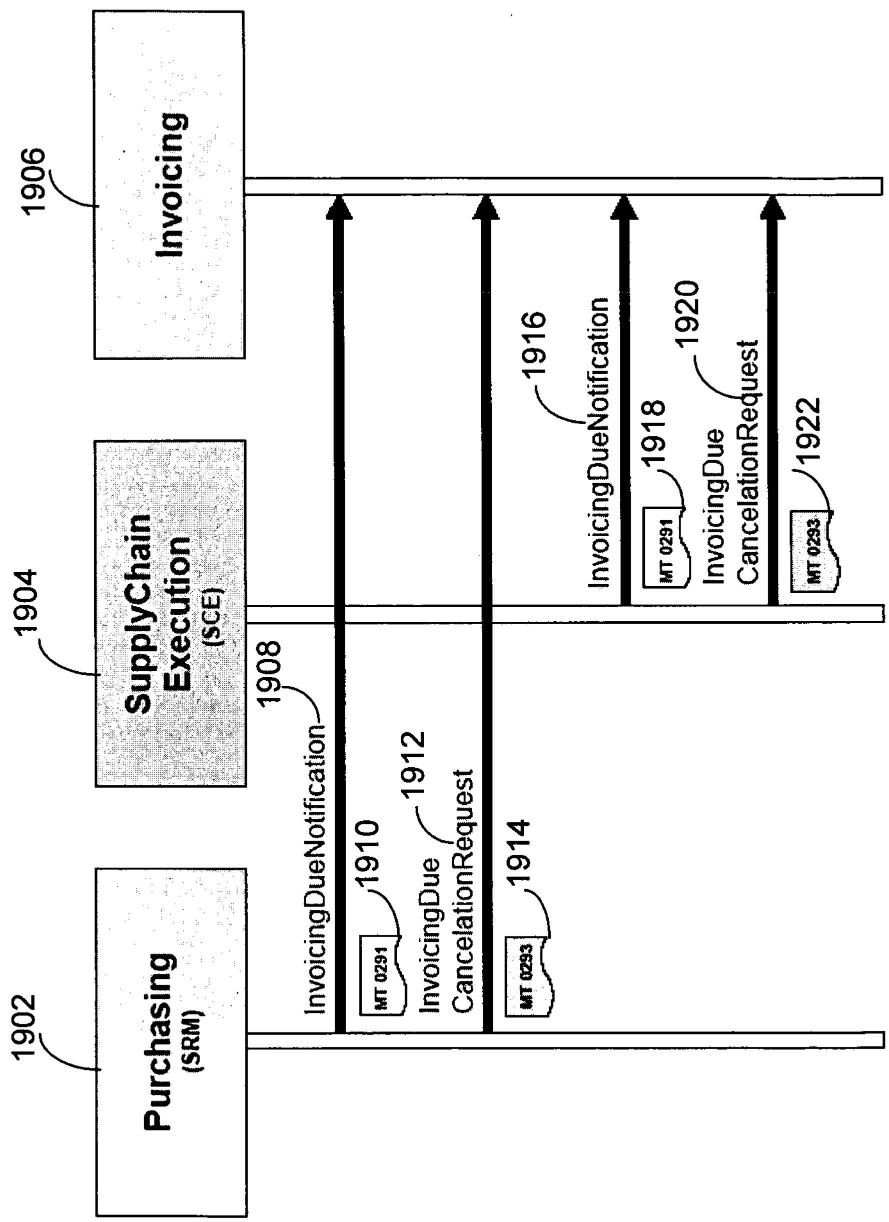
FIG. 19 depicts a message choreography of Invoicing Due in accordance with methods and systems consistent with the present invention.

FIG. 19 depicts the message choreography of Invoicing Due. The Invoicing Due choreography involves three components: Purchasing (SRM) 1902, Supply Chain Execution (SCE) 1904, and Invoicing 1906.

The SRM 1902 sends an InvoicingDueNotification message 1908 to Invoicing 1906. The message type 1910 of the InvoicingDueNotification message 1908 is 0291, i.e., a notification about invoicing-relevant data communicated to an application in which the operative verification and creation of invoices takes place, and/or in which “self billing” invoices (evaluated receipt settlement) are created.

The SRM 1902 sends an InvoicingDueCancellationRequest message 1912 to Invoicing 1906. The message type 1914 of the InvoicingDueCancellationRequest message 1912 is 0293, i.e., a request for the full cancellation of an InvoicingDueNotification previously sent to invoice verification.

The SCE 1904 sends an InvoicingDueNotification message 1916 to Invoicing 1906. The message type 1918 of the InvoicingDueNotification message 1916 is 0291, i.e., a notification about invoicing-relevant data communicated to an application in which the operative verification and creation of invoices takes place, and/or in which “self billing” invoices (evaluated receipt settlement) are created.

The SCE 1904 sends an InvoicingDueCancellationRequest message 1920 to Invoicing 1906. The message type 1922 of the InvoicingDueCancellationRequest message 1920 is 0293, i.e., a request for the full cancellation of an InvoicingDueNotification previously sent to invoice verification.

(c) Invoice

Figure 20:
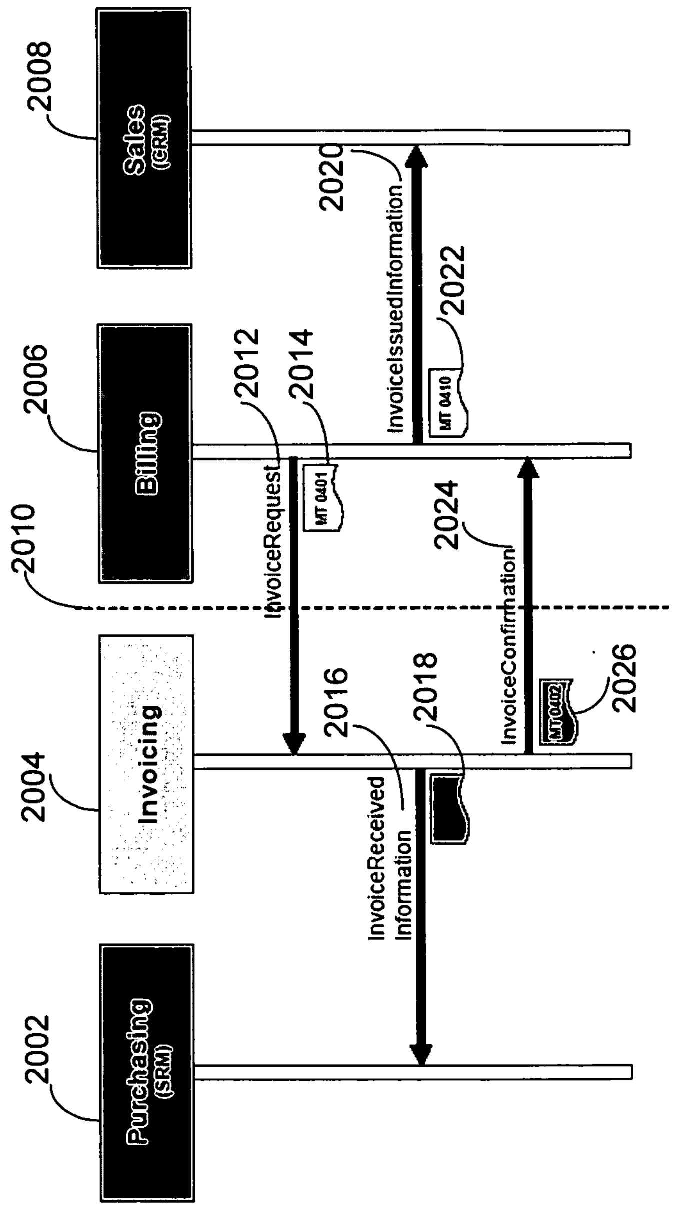
FIG. 20 depicts a message choreography of an Invoice in accordance with methods and systems consistent with the present invention.

FIG. 20 depicts the message choreography of an Invoice. The Invoice choreography involves four components: Purchasing (SRM) 2002, Invoicing 2004, Billing 2006, and Sales (CRM) 2008. Line 2010 denotes a company border. Thus, one company includes SRM 2002 and Invoicing 2004, while another company includes Billing 2006 and CRM 2008.

Billing 2006 sends an InvoiceRequest message 2012 to Invoicing 2004. The message type 2014 of the InvoiceRequest message 2012 is 0401, i.e., a legally binding notice about accounts receivable or accounts payable for delivered goods or provided services—typically a request that payment be made for these goods or services.

Invoicing 2004 sends an InvoiceReceivedInformation message 2016 to the SRM 2002. The message type 2018 of the InvoiceReceivedInformation message 2016 can be a conventional Invoice Received Information.

Billing 2006 sends an InvoiceIssuedInformation message 2020 to Sales 2008. The message type 2022 of the InvoiceIssuedInformation message 2020 is 0410, i.e., information about provided services, delivered products, or credit or debit memo request items that have been billed, the items of an invoice that have been used for this, and the extent to which they have been billed.

Invoicing 2004 sends an InvoiceConfirmation message 2024 to Billing 2006. The message type 2026 of the InvoiceConfirmation message 2024 is 0402, i.e., the repose of a recipient of an invoice to the bill-from-party by which the invoice as a whole is confirmed, rejected, or classified as ‘not yet decided.’

(d) Invoice Accounting and Payment Due

Figure 21:
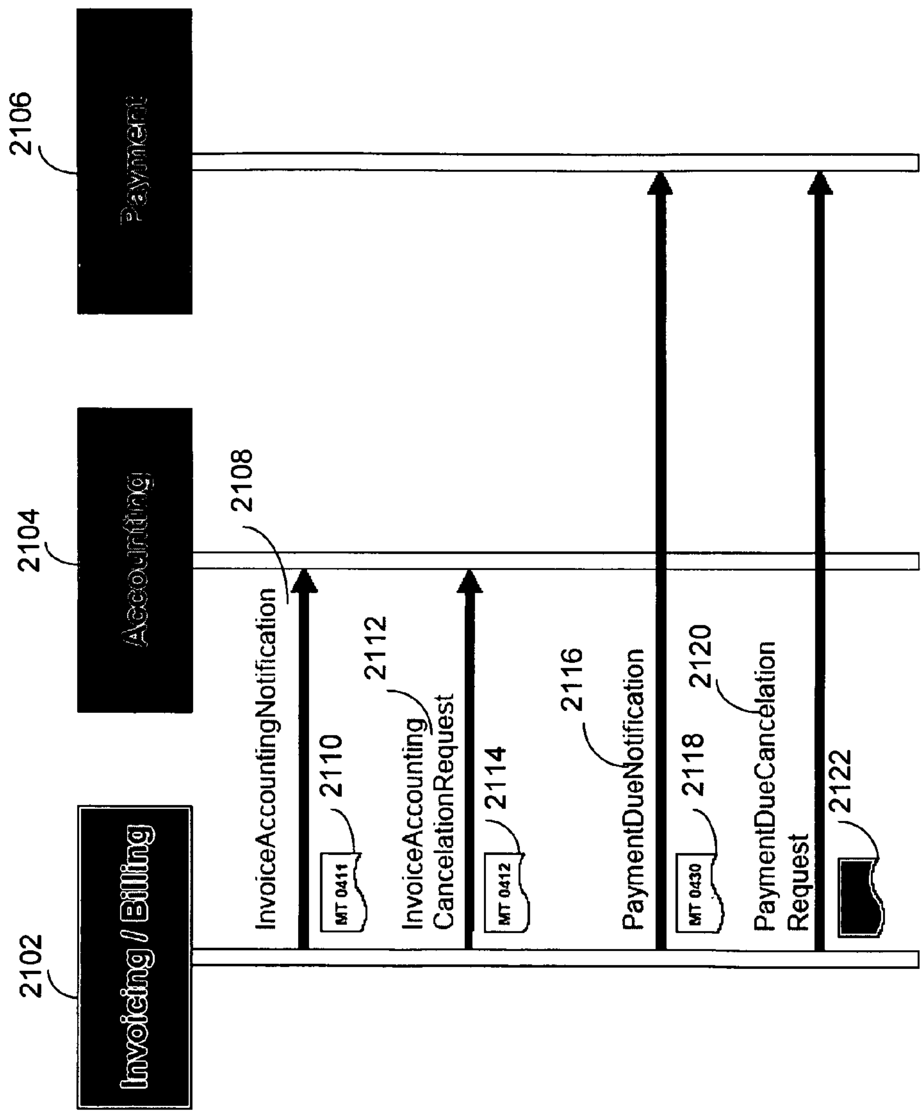
FIG. 21 depicts a message choreography of Invoice Accounting and Payment Due in accordance with methods and systems consistent with the present invention.

FIG. 21 depicts the message choreography of Invoice Accounting and Payment Due. The Invoice Accounting and Payment Due choreography involves three components: Invoicing/Billing 2102, Accounting 2104 and Payment 2106.

Invoicing/Billing 2102 sends an InvoiceAccountingNotification message 2108 to Accounting 2104. The message type 2110 of the InvoiceAccountingNotification message 2108 is

0411, i.e., a notification to financials about information on incoming or outgoing invoices from invoice verification or billing.

Invoicing/Billing 2102 sends an InvoiceAccountingCancellationRequest message 2112 to Accounting 2104. The message type 2114 of the InvoiceAccountingCancellationRequest message 2112 is 0412, i.e., a request for the full cancellation of posting information previously sent to financials, regarding an incoming or outgoing invoice or credit memo.

Invoicing/Billing 2102 sends a PaymentDueNotification message 2116 to Payment 2106. The message type 2118 of the PaymentDueNotification message 2116 is 0430, i.e., the PaymentDueNotification notifies an application (Payment), in which subsequent operative processing of payments take place, about due dates (accounts receivable and accounts payable) of business partners.

Invoicing/Billing 2102 sends a PaymentDueCancellationRequest message 2120 to Payment 2106. The message type 2122 of the PaymentDueCancellationRequest message 2120 can be any conventional Payment Due Cancellation Request.

(e) Tax Due

Figure 22:
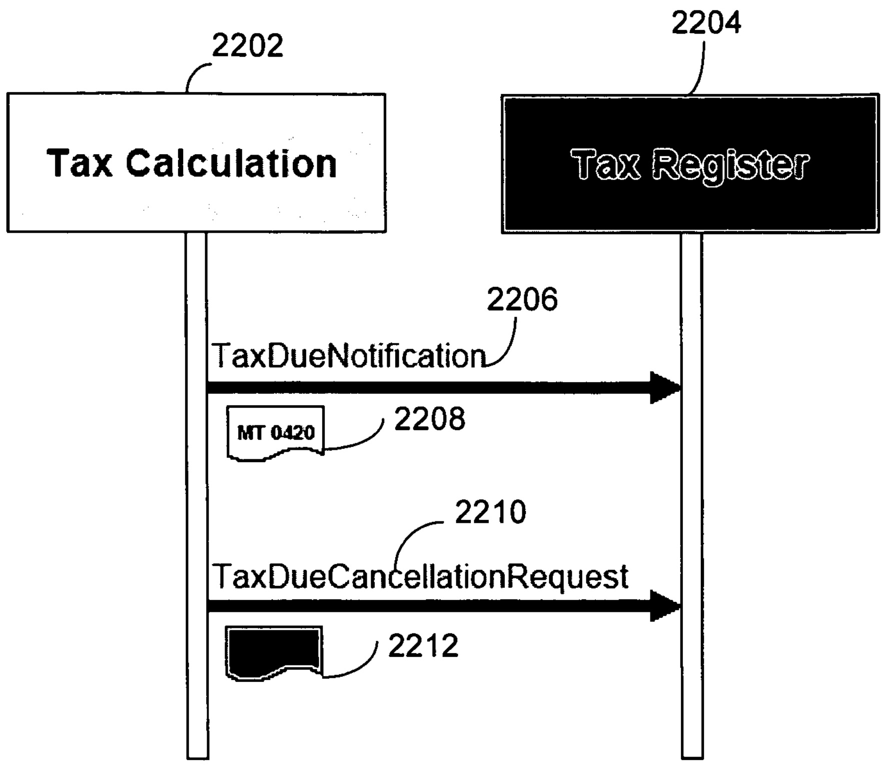
FIG. 22 depicts a message choreography of Tax Due in accordance with methods and systems consistent with the present invention.

FIG. 22 depicts the message choreography of Tax Due. The Tax Due choreography involves two components: Tax Calculation 2202 and Tax Register 2204.

Tax Calculation 2202 sends a TaxDueNotification message 2206 to the Tax Register 2204. The message type 2208 of the TaxDueNotification message 2206 is 0420, i.e., the TaxDueNotification communicates data from tax determination and calculation relevant for tax reports and tax payments to the tax register of a company.

Tax Calculation 2202 sends a TaxDueCancellationRequest message 2210 to the Tax Register 2204. The message type 2212 of the TaxDueCancellationRequest message 2210 can be any conventional Tax Due Cancellation Request.

Figure 23:
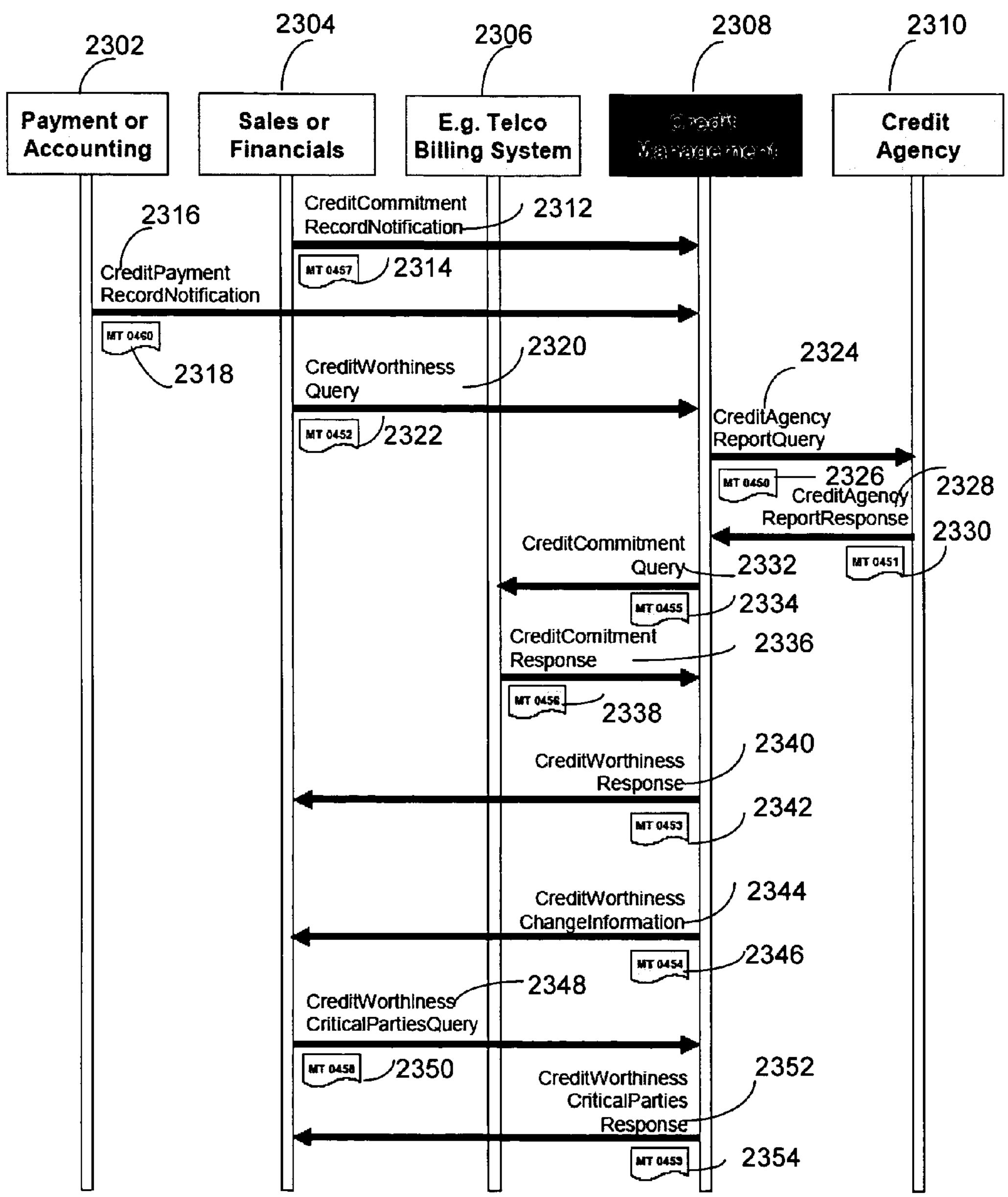
FIG. 23 depicts a message choreography of Credit Worthiness, Credit Agency Report, Credit Payment, and Credit Commitment in accordance with methods and systems consistent with the present invention.

(f) Credit Worthiness, Credit Agency Report, Credit Payment, and Credit Commitment FIG. 23 depicts the message choreography of Credit Worthiness, Credit Agency Report, Credit Payment, and Credit Commitment. The Credit Worthiness, Credit Agency Report, Credit Payment, and Credit Commitment choreography involves five components: Payment or Accounting 2302, Sales or Financials 2304, a Billing System (e.g., Telco) 2306, Credit Management 2308, and Credit Agency 2310.

Sales or Financials 2304 sends a CreditCommitmentRecordNotification message 2312 to Credit Management 2308. The message type 2314 of the CreditCommitmentRecordNotification message 2312 is 0457, i.e., a notice to credit management about existing payment obligations of business partners.

Payment or Accounting 2302 sends a CreditPaymentRecordNotification message 2316 to Credit Management 2308. The message type 2318 of the CreditPaymentRecordNotification message 2316 is 0460, i.e., a notice to credit management about the payment behavior of business partners.

Sales or Financials 2304 sends a CreditWorthinessQuery message 2320 to Credit Management 2308. The message type 2322 of the CreditWorthinessQuery message 2320 is 0452, i.e., an inquiry to credit management concerning the credit worthiness of a business partner.

Credit Management 2308 sends a CreditAgencyReportQuery message 2324 to Credit Agency 2310. The message type 2326 of the CreditAgencyReportQuery message 2324 is 0450, i.e., an inquiry to a credit agency concerning the credit report for a business partner.

Credit Agency 2310 sends a CreditAgencyReportResponse message 2328 to Credit Management 2308. The message type 2330 of the CreditAgencyReportResponse message 2328 is 0451, i.e., a response from a credit agency concerning the inquiry about the credit report for a business partner.

Credit Management 2308 sends a CreditCommitmentQuery message 2332 to the Billing System 2306. The message type 2334 of the CreditCommitmentQuery message 2332 is 0455, i.e., an inquiry from credit management concerning existing payment obligations of a business partner.

The Billing System 2306 sends a CreditCommitmentResponse message 2336 to Credit Management 2308. The message type 2338 of the CreditCommitmentResponse message 2336 is 0456, i.e., a response concerning an inquiry from credit management about existing payment obligations of a business partner.

Credit Management 2308 sends a CreditWorthinessResponse message 2340 to Sales or Financials 2304. The message type 2342 of the CreditWorthinessResponse message 2340 is 0453, i.e., a response from credit management concerning the inquiry about the credit worthiness of a business partner.

Credit Management 2308 sends a CreditWorthinessChangeInformation message 2344 to Sales or Financials 2304. The message type 2346 of the CreditWorthinessChangeInformation message 2344 is 0454, i.e., information about changes of the credit worthiness of a business partner.

Sales or Financials 2304 sends a CreditWorthinessCriticalPartiesQuery message 2348 to Credit Management 2308. The message type 2350 of the CreditWorthinessCriticalPartiesQuery message 2348 is 0458, i.e., an inquiry to credit management about business partners, for which the credit worthiness has been rated as critical.

Credit Management 2308 sends a CreditWorthinessCriticalPartiesResponse message 2352 to Sales or Financials 2304. The message type 2354 of the CreditWorthinessCriticalPartiesResponse message 2352 is 0459, i.e., a response from credit management concerning an inquiry about business partners, for which the credit worthiness has been rated as critical.

(5) Human Capital Management (a) Personnel Time Sheet

Figure 24:
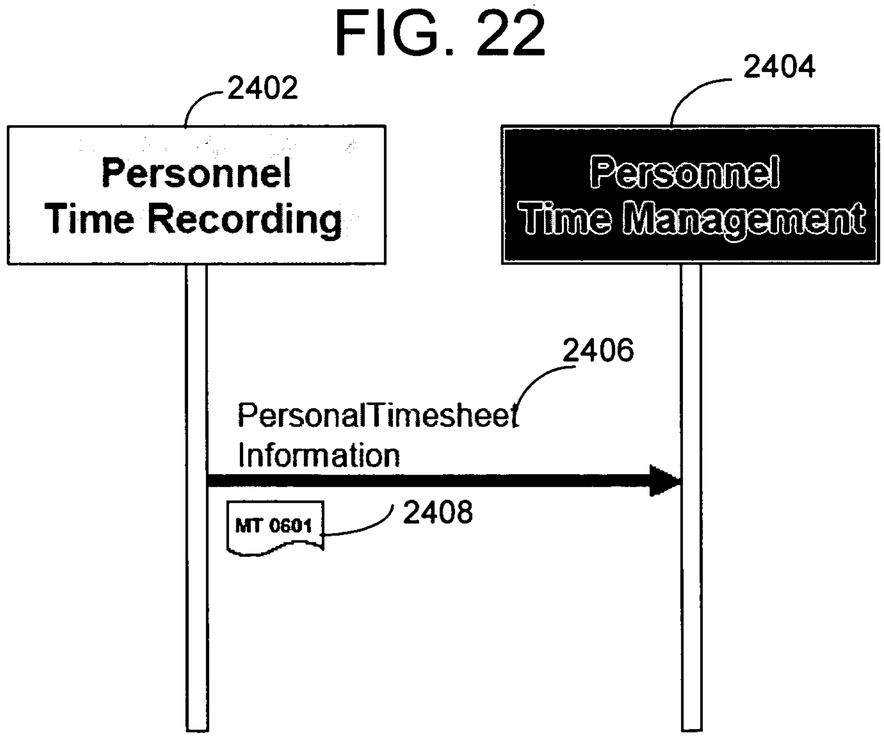
FIG. 24 depicts a message choreography of a Personnel Time Sheet in accordance with methods and systems consistent with the present invention.

FIG. 24 depicts the message choreography of a Personnel Time Sheet. The Personnel Time Sheet choreography involves two components: Personnel Time Recording 2402 and Personnel Time Management 2404.

Personnel Time Recording 2402 sends a PersonalTimeSheetInformation message 2406 to Personnel Time Management 2404. The message type 2408 of the PersonalTimeSheetInformation message 2406 is 0601, i.e., the PersonnelTimeSheetInformation communicates recorded personnel times and personnel time events from an upstream personnel time recording system to personnel time management.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

A business object is a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

The following sections © SAP AG.

a) Data Types

Data types are used to type object entities and interfaces with a structure. This typing can include business semantic. For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is constructed with reference to a use, and is thus a use-specific assembly of GDTs and CDTs. The data types can be aggregated to complex data types.

To achieve a harmonization across business objects and interfaces, the same subject matter is always typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

(1) CoreComponentTypes (CCTs)

(a) Amount

A CCT Amount 2500 is used to represent amounts, costs, remunerations, and fees. A CCT Amount 2500 includes an amount with the corresponding currency unit. An example of the CCT Amount 2500 is: <Amount currencyCode="EUR">777.95</Amount>, which represents the amount 777.95 Euros.

The structure of CCT Amount 2500 is depicted in FIG. 25. CCT Amount 2500 includes the attribute currencyCode 2502. For CCT Amount 2500, the Category is complexType 2504, the Property is Amount 2510, the Representation/Association is Content 2514, the Type is xsd 2518, the Type Name is decimal 2522, and the Length can have a maximum 22 predecimal places and 6 decimal places 2626.

For the currencyCode 2502, the Category is Attribute 2506, the Object Class is Amount 2508, the Property is Currency 2512, the Representation/Association is Code 2516, the Type is xsd 2520, the Type Name is token 2524, and the Length is three 2528. The Cardinality between CCT Amount 2500 and currencyCode 2502 is one 2530. CurrencyCode 2502 is mandatory 2532. CurrencyCode 2502 requires the currency to always be specified.

(b) BinaryObject

A CCT BinaryObject 2600 includes a finite data stream of any number of characters in binary notation (octets). CCT BinaryObject 2600 can be delivered to a partner using two methods: (1) an implicit representation as an element value; or (2) as a MIME attachment within a message, with a unique URI-based reference to the corresponding attachment. An example for CCT BinaryObject 2600 is a representation of CCT BinaryObject 2600 as an element value based on base64encoding is:

<BinaryObject typeCode="application/zip" name="photos.zip">
T2xkIE1hY0RvbmFsZCBoYWQgYSBmYXJtCkUgSS
BFIEkgTwpBbmQgb24gaGlzIGZhcm0gaGUgaGFk
IHNvbWUgZHVja3MKRSBJIEUgSSBPCldpdGggYS
BxdWFjayBxdWFjayBoZXJlLAphIHF1YWNrIHF1
YWNrIHRoZXJlLApldmVyeSB3aGVyZSBhIHF1YW
NrIHF1YWNrCkUgSSBFIEkgTwo=
</BinaryObject>.

An example of a reference to CCT BinaryObject 2600 that is delivered as a MIME attachment within a message is:

<BinaryObject uri="cid:a34ccrt@15.4.9.92/s445"/>.

The element value of CCT BinaryObject 2600 is based on the XML-scheme-specific built-in data type xsd: base64binary. This enables any binary data to be represented using base64encoding. This is done using the base64Content-Transfer-Encoding procedure.

The structure of CCT BinaryObject 2600 is depicted in FIG. 26. CCT BinaryObject 2600 includes attributes mimeCode 2602, charSetCode 2604, format 2606, filename 2608, and URI 2610. For CCT BinaryObject 2600, the Category is complexType 2612, the Property is Binary-Object 2634, the Representation/Association is Content 2646, the Type is xsd 2658, and the Type Name is base64binary 2670.

MimeCode 2602 identifies the medium type (image, audio, video, application) of the binary content according to the MIME type definition in IETF RFC 2046 and the corresponding MIME type recommendations. For mimeCode 2602, the Category is Attribute 2614, the Object Class is Binary-Object 2625, the Property is mime 2636, the Representation/Association is Code 2648, the Type is xsd 2660, the Type Name is token 2672, and the Cardinality may be 0 or 1 2680. Mimecode 2602 is necessary when CCT BinaryObject 2600 is represented as an element value (see 2688).

CharSetCode 2604 identifies the specific character set of text data. For CharSetCode 2604, the Category is Attribute 2616, the Object Class is Binary-Object 2626, the Property is Character Set 2638, the Representation/Association is Code 2650, the Type is xsd 2662, the Type Name is token 2674, and the Cardinality may be 0 or 1 2680. CharSetCode 2604 is necessary when CCT BinaryObject 2600 is represented as an element value and comprises text data (see 2690).

Format 2606 describes the format of the binary content if the format is not clear or unique from the "mimeCode." For Format 2606, the Category is Attribute 2618, the Object Class is Binary-Object 2628, the Property is Format 2640, the Representation/Association is Text 2652, the Type is xsd 2664, the Type Name is token 2675, and the Cardinality may be 0 or 1 2684. Format 2606 may be optional (see 2692).

Filename 2608 contains the corresponding name or file name of the binary content according to the MIME protocol. For filename 2608, the Category is Attribute 2620, the Object Class is Binary-Object 2630, the Property is Filename 2642, the Representation/Association is Text 2654, the Type is xsd 2666, the Type Name is string 2676, and the Cardinality is may be 0 or 1 2686. Filename 2608 is not defined in ebXML CCTS 1.8, but it is to be submitted. Filename 2608 also conforms with IETF RFC 1341 (see 2694).

URI 2610 references the physical location of CCT BinaryObject 2600 if this is represented as a MIME attachment in a SOAP message or in an ebXML-MSG message. The syntax of the URI is defined in the IETF RFC 2396 recommendation and is as follows:
<scheme>.<scheme-specific part>. For URI 2610, the Category is Attribute 2622, the Object Class is Binary-Object 2632, the Property is Uniform Resource 2644, the Representation/Association is Identifier 2656, the Type is xsd 2668, and the Type Name is anyURI 2678. URI 2610 is necessary when referencing a remote CCT BinaryObject 2600 (see 2696).

As enumerated by the Internet Assigned Numbers Authority (IANA), November 2002, various MIME types are available for mimeCode 2602. For example one MIME type may be iso-8859-n, where n is a placeholder for the number of the relevant ISO character set from 1 to 9. Another example MIME type is us-ascii.

Various URI schemes are also available for the scheme-specific part in the URI, as enumerated by the IANA. For example, one available scheme is cid which is a content identifier. Another available scheme is uuid, which is a Universal Unique Identifier Scheme.

CCT BinaryObject 2600 can be used for binary data and all types of binary files. This includes graphics (such as diagrams, mathematic curves, and the like), pictures (such as photos, passport photos, and the like), sound recordings, video recordings, and documents in binary notation (such as PDF, DOC, and XLS files). The primary Representation/Association for CCT BinaryObject 2600 is BinaryObject. Additional secondary Representation/Associations may be Graphic, Picture, Sound and Video.

The useful data in Binary Object 2600 may be delivered either as an element value using base64octet representation or as a MIME attachment. In certain embodiments, CCT BinaryObject 2600 is not used to reference a file that is located on a Web server. The global data type "WebAddress" is available for this purpose. If CCT BinaryObject 2600 is in a MIME attachment, the URI 2610 may reference the corresponding "Content ID" of the respective MIME attachment. For this purpose, URI scheme cid may be used, which identifies a freely defined "Content ID". URI scheme uuid may also be used for this purpose. Uuid identifies a unique identification in accordance with UUID guidelines.

It is not necessary to specify the "typeCode" and "fileName" attributes in a MIME attachment, since this information is contained in the MIME attachment itself.

(c) Code

A CCT Code 2700 is a character string of letters, numbers, special characters (except escape sequences), and symbols. It represents a definitive value, a method, or a property description in an abbreviated or language-independent form. An example for the CCT Code 2700 is: a Standard Code/Standard Agency is <SecurityErrorCode listID="DE 0571" listAgencyID="6">4</SecurityErrorCode>.

An example of a Proprietary Code/Standard Agency is <SecurityErrorCode listID="SEC" listAgencyID="065055766"listAgencySchemeID="DUNS" listAgencySchemeAgencyID="016">ANS</SecurityErrorCode>.

An example of a Proprietary Code/Proprietary Agency is <SecurityErrorCode listID="SEC" listAgencyID="4711"listAgencySchemeID="PartyA" listAgencySchemeAgencyID="ZZZ">ER05</SecurityErrorCode>

The structure of CCT Code 2700 is depicted in FIG. 27. CCT Code 2700 includes Attributes listID 2702, listVersionID 2704, listAgencyID 2706, listAgency-SchemeID 2708, and listAgency-SchemeAgencyID 2710. For CCT Code 2700, the Category is complexType 2712, the Property is Code 2734, the Representation/Association is Content 2746, the Type is xsd 2758, and the Type Name is token 2770.

ListID 2702 identifies a list of the codes that belong together. ListID 2702 is unique within the agency that manages this code list. For listID 2702, the Category is Attribute 2714, the Object Class is CodeList 2724, the Property is Identification 2736, the Representation/Association is Identifier 2748, the Type is xsd 2760, the Type Name is token 2772, and the Cardinality is may be 0 or 1 2782. The attribute ListID may be optional (see 2792).

ListVersionID 2704 identifies the version of a code list. For listVersion ID 2704, the Category is Attribute 2716, the Object Class is CodeList 2726, the Property is Version 2738, the Representation/Association is Identifier 2750, the Type is xsd 2762, the Type Name is token 2774, and the Cardinality may be 0 or 1 2784. The attribute ListVersionID may be optional (see 2792).

ListAgencyID 2706 identifies the agency that manages the code list. The agencies from DE 3055 are used as the default (without roles). For listAgencyID 2706, the Category is Atribute 2718, the Object Class is CodeListAgency 2728, the Property is Identification 2740, the Representation/Association is Identifier 2752, the Type is xsd 2764, the Type Name is token 2776, and the Cardinality is may be 0 or 1 2786. The attribute ListAgencyID may be optional (see 2796).

ListAgencySchemeID 2708 identifies the identification scheme that represents the context that is used to identify the agency. For listAgencySchemeID 2708, the Category is Attribute 2720, the Object Class is CodeListAgency 2730, the Property is Scheme 2742, the Representation/Association is Identifier 2754, the Type is xsd 2766, the Type Name is token 2778, and the Cardinality is may be zero or one 2788. The attribute ListVersionAgencyID may be optional (see 2797).

ListAgencySchemeAgencyID identifies the agency that manages the listAgencySchemeID. This attribute can contain values from DE 3055 (excluding roles). For listAgencySchemeAgencyID 2710, the Category is Attribute 2722, the Object Class is CodeListAgency 2732, the Property is SchemeAgency 2744, the Representation/Association is Identifier 2756, the Type is xsd 2768, the Type Name is token 2780, and the Cardinality may be zero or one 2790. The attribute listAgencySchemeAgencyID may be optional (see 2798).

The CCT Code 2700 data type is used for elements that are used in the communication between partners or systems to enable a common coded value representation in place of texts, methods, or properties. This code list should be relatively stable, and not subject to frequent or significant changes (for example, CountryCode, LanguageCode, and so on). If the agency that manages the code list is not named explicitly, but is specified by using a role, this is done in the tag name.

Standardized codes and proprietary codes may be represented by CCT Code 2700. For standardized codes whose code lists are managed by an agency from the DE 3055 code list, listID 2702 identifies the code list for the standard code, listVersionID 2704 identifies the version of the code list, and listAgencyID 2706 identifies the agency from DE 3055 (excluding roles). For proprietary codes whose code lists are managed by an agency that is identified using a standard, listID 2702 identifies a code list for the proprietary code, listVersionID 2704 identifies a version of the code list, listAgencyID 2706 identifies standardized ID for the agency (such as the company that manages the proprietary code list), listAgencySchemeID 2708 identifies the identification scheme for the schemeAgencyID, and listAgencySchemeAgencyID 2710 identifies the agency from DE 2055 that manages the standardized ID 'listAgencyID'. For proprietary codes whose code lists are managed by an agency that is identified without the use of a standard, list ID 2702 identifies a code list for the proprietary code, listVersionID 2704 identifies a version of the code list, listAgencyID 2706 identifies a proprietary ID for the agency (such as the company that manages the proprietary code list), list AgencySchemeID 2708 identifies the identification scheme for the schemeAgencyID, and listAgencySchemeAgencyID 2710 identifies 'ZZZ' which is mutually defined from DE 3055.

For proprietary codes whose code lists are managed by an agency that is specified using a role or not at all, listID 2702 identifies an identification scheme for the proprietary identifier, and listVersionID 2704 identifies a version of the identification scheme. The role is specified as a prefix in the tag name. If there is more than one code list, listID and listVersionID can be used as attributes. No attributes are required if there is only one code list.

The representation term for the CCT Code 2700 is Code.

If CCT Code 2700 is used as a basis to define a specific code GDT that combines parts of standard code lists of different standardization organizations, and the complied lists are not disjunctive, attributes listID 2702, listVersionID 2704, and listAgencyID 2706 may be included in the GDT. However, these attributes may not be required in the GDT if the compiled lists are not disjunctive but, in each interface that uses the GDT, the lists supported by the interface are disjunctive.

To be able to represent values, methods, and property descriptions as code, the corresponding code list may be consistent and, unlike identifier lists, subject to very few changes to its content. In certain embodiments, CCT Code 2700 is not used to uniquely identify any logical or real objects. In some cases it may not be possible to differentiate clearly between Identifier and Code for coded values. This is particularly applicable if a coded value is used to uniquely identify an object and, at the same time, this coded value is used to replace a longer text. For example, this includes the coded values for "Country," "Currency," "Organization," "Region," and the like. If the list of coded values in this case is consistent, then the GDT Code can be used for the individual coded values.

For example, a passport number (PassportId) is an "Identifier," because a) it identifies a (real) object, namely, a natural person, and b) the list of passport numbers is constantly growing as new passport numbers are issued. A country code (CountryCode or CountryId) may be either an Identifier or a Code. The country code uniquely identifies a real object, namely, the country. However, the country code itself is also a replacement for the respective (unique) country name. Therefore, it is also a Code. Since the code list is relatively consistent, the country name should be represented as a Code. Changes are caused by political events and such changes are few in comparison to those relating to natural persons. A process code (ProcessCode) is a Code, because a) it describes a method type and not an object, and b) the list of process codes seldom changes.

(d) DateTime

A CCT DateTime 2800 is the time stamp, accurate to the second, of a calendar day. An example for CCT DateTime 2800 is: the following code represents Apr. 19, 2002 at 3:30, in Berlin:

<DateTime>2002-04-19T15:30:00+01:00</DateTime>.

The structure of CCT DateTime 2800 is depicted in FIG. 28. The Category for CCT DateTime 2800 is simpleType 2802, the Property is DateTime 2804, the Representation/Association is Content 2806, the Type is xsd 2808, and the Type Name is dateTime 2810.

The CCT DateTime 2800 core component type uses the W3C built-in data type xsd:dateTime. This is structured in accordance with the extended representation of ISO 8601. However, unlike in xsd:date, in certain embodiments, negative years or years are not represented with more than 4 numeric values in "Date." The extended representation may be represented as CCYY-MM-DDThh:mm:ss(.sss)Z or CCYY-MM-DDThh:mm:ss(.sss)(+/−)hh:mm (for example, 2002-04-19T15:30:00Z or 2002-04-19T10:30:00+05:00, respectively).

The extended representation uses CC for century (00-99); YY for year (00-99); MM for month (01-12); DD for day (01-28 for month 02; 01-29 for month 02 when the year is a leap year; 01-30 for months 04, 06, 09, and 11; 01-31 for months 01, 03, 05, 07, 08, 10, and 12); a hyphen between the year, month, and day; a separator "T" between the date and time; hh for hours (00-23); mm for minutes (00-59); ss for seconds (00-59); sss for one or more characters after the decimal point to represent fractions of a second; a colon between the hours, minutes, and seconds; Z to specify when the represented time is also the UTC time; +hh:mm to specify when the represented time is a local time that is ahead of UTC time; and −hh:mm to specify when the represented time is a local time that is behind UTC time.

The time stamp may be indicated without additional information (Z, +hh:mm, −hh:mm) relative to the coordinated world time (UTC time). In certain embodiments, this time stamp is not then be converted to the respective local time and is therefore for information purposes.

Ranges Day, Time, Minutes, Seconds, and Time Zone are defined for DateTime. Day represents all dates from the Gregorian calendar. Time represents exactly 24 hours (0-23). Minutes represents exactly 60 minutes (0-59). Seconds represents exactly 60 seconds (0-59). Time zone may be expressed in UTC (Coordinated Universal Time). If DateTime represents a local time, the time difference with respect to UTC time may also be specified.

CCT DateTime 2800 is used for exact time stamps that may contain the day and time. It may be, the creation date/time, receipt date/time, processing date/time, delivery date/time, expiry date/time, and the like. The primary representation term for the CCT DateTime 2800 is DateTime. Additional secondary representation terms are Date and Time. Date is a calendar representation of a particular day. The Built-In Data Type of Date is xsd:date and a restriction is length=10. Time is a time stamp, accurate to the second, of a particular time. The Built-In Data Type for Time is xsd:time.

The coordinated world time or coordinated universal time (UTC) is currently the uniform basis for time specifications that are used internationally. It is based on the route of the sun and is an extremely constant time unit. The mean solar time at the Greenwich meridian can be used as an approximate guide value for UTC.

The Gregorian calendar is currently used primarily in the western world and is an approximation of the complicated calculation of a "tropical year." The mean of the "tropical year" is 365.2422 days. The Gregorian calendar, in use since 1582, defines the rules for leap years.

(e) ElectronicAddress

A CCT ElectronicAddress 2900 is a unique digital address that is represented by the Unified Resource Identifier (URI). An example for CCT ElectronicAddress 2900 in http format is:

```
<Address>
    http://www.sap.com/InterfaceRepository/ElectronicAddresses/
    description.htm
</Address>
One example representation of an X.400 address is:
<Address protocolID="XF" >
    mailto:c=DE;a=SAP;p=SAP;o=EXCHANGE;s=STUHEC;g=
    GUNTHER
</Address>.
```

The structure of CCT ElectronicAddress 2900 is depicted in FIG. 29. CCT ElectronicAddress 2900 includes attributes protocolID 2902 and languageCode 2904. The Category for CCT ElectronicAddress 2900 is complexType 2906, the Property is ElectronicAddress 2916, the Representation/Association is Content 2922, the Type is xsd 2928 and the Type Name is anyURI 2934.

For protocolID 2902, the Category is Attribute 2908, the Object Class is ElectronicAddress 2912, the Property is Protocol 2918, the Representation/Association is Identifier 2924, the Type is xsd 2930, the Type Name is token 2936, and the Cardinality between the CCT Electronic Address 2900 and protocolID 2902 is zero or one 2942. The protocolID Attribute 2902 may be optional (see 2946).

For languageCode 2904, the Category is Attribute 2908, the Object Class is ElectronicAddress 2914, the Property is Langauge 2920, the Representation/Association is Code 2926, the Type is xsd 2932, the Type Name is language 2938, the Length is from two to nine 2940, and the Cardinality between CCT Electronic Address 2900 and languageCode 2904 is zero or one 2944. The langaugeCode Attribute 2904 may be optional (see 2948).

The syntax for CCT Electronic Address 2900 is specified in the IETF RFC 2396. A URI consists of the scheme (in other words, how to access a resource), followed by a colon and the scheme-specific part. The scheme-specific part is relevant for the service that is connected to the particular scheme. A resource can have multiple URIs. One reason may be that a resource exists physically at multiple locations, due to mirroring, or it may be addressed using different protocols, which are specified by the scheme name. For example, a file can be referenced using http and ftp.

A URI is therefore generally constructed as <scheme>:<scheme-specific part>. The following is an example of a URL with typical partial expression types:

<scheme>://<user>:<password>@<host>:<port>/<path>?<query>;

<argument>=<value>&<argument>=<value>#<fragment>.

URI schemes that are available include ftp, http, mailto, File, cid, mid, nfs, https, uuid. Additional URI schemes that are currently not required include Gopher, News, nntp, telnet, wais, prospere, z39.50s, z39.50r, vemmi, service, imap, acap, rtsp, tip, pop, data, dav, opaquelocktoken, sip, tel, fax, modem, Idap, soap.beep, soap.beeps, urn, go, afs, tn3270, and mailserver.

If the above-listed URI schemes are not sufficient to determine the address protocol, one can either apply for another URI scheme in accordance with the guidelines of IETF RFC 2717, or define the corresponding protocol type more exactly by specifying the "protocolID" attribute as well. For this protocol type, the codes from the UN/EDIFACT DE 3155 "Communication Address Code Qualifier" code list are used. These codes include AB, AF, AN, AO, EM, EI, FT, GM, IM, SW, and XF. AB refers to Communications number assigned by Societe Internationale de Telecommunications Aeronautiques (SITA). AD refers to the AT&T mailbox identifier. AF refers to the switched telecommunications network of the United States Department of Defense. AN refers to the ODETTE File Transfer Protocol. AO refers to identification of the Uniform Resource Location (URL) Synonym: World wide web address. EM refers to the Electronic Mail Exchange of mail by electronic means (SMTP). EI refers to the number identifying the service and service user of an EDI transmission. FT refers to the file transfer access method according to ISO. GM refers to the GEIS (General Electric Information Service) mailbox. IM refers to the Internal mail address/number. SW refers to communications address assigned by Society for Worldwide Interbank Financial Telecommunications s.c. XF refers to the X.400 address.

No codings currently exist for ms (Microsoft Mail) and ccmail protocols, although respective coding proposals are expected to be submitted to the UN/CEFACT Forum for standardization.

If the attachment is a document or text, attribute languageCode 2904 may be used to represent the language of the attachment in accordance with IETF RFC 1766 or IETF RFC 3066.

CCT ElectronicAddress 2900 is a core component type that can be used to represent global data types (GDTS) for email addresses, Web sites, and documents or information provided on Web sites. The representation term for the CCT ElectronicAddress 2900 is ElectronicAddress.

In certain embodiments, CCT ElectronicAddress 2900 is not used as a reference component for binary data that is sent as an additional MIME attachment. The CCT BinaryObject 2900 is available for this purpose.

(f) Identifier

A CCT Identifier 3000 is a unique identification of an object within an identification scheme that is managed by an agency. There may be multiple identification schemes for identifying an object. An example for CCT Identifier 3000 is: a Standard Identifier/Standard Agency is <ProductID schemeID="GTIN" schemeAgencyID="113">10614141000415</ProductId>. One example of a Proprietary Identifier/Standard Agency is <ProductID schemeID="householdappliance" schemeAgencyID="065055766" schemeAgencySchemeID="DUNS" schemeAgencySchemeAgencyID="016">123</ProductId>. One example of a Proprietary Identifier/Proprietary Agency is <ProductID schemeID="householdappliance" schemeAgencyID="4711" schemeAgencySchemeID="PartyA" schemeAgencySchemeAgencyID="ZZZ">456</ProductId>.

The structure of CCT Identifier 3000 is depicted in FIG. 30. CCT Identifier 3000 includes Attributes schemeID 3002, schemeVersionID 3004, schemeAgencyID 3006, schemeAgency-SchemeID 3008, and schemeAgency-SchemeAgencyID 3010. For CCT Identifier 3000, the Category is complexType 3012, the Object Class is Identifier 3024, the Property is identifier 3036, the Representation/Association is Content 3048, the Type is xsd 3060, and the Datatype is token 3072.

SchemeID 3002 identifies an identification scheme. The identification scheme represents the context that is used to identify an object. SchemeID is unique within the agency that manages this identification scheme. For schemeID, the Category is Attribute 3014, the Object Class is Identification-Scheme 3026, the Property is Identification 3038, the Representation/Association is Identifier 3050, the Type is xsd 3062, the Datatype is token 3074, and the Length is from one to sixty 3084. The Cardinality between the CCT Identifier 3000 and schemeID 3002 is zero or one 3090. The schemeID attribute 3002 may be optional (see 3095).

SchemeVersionID 3004 identifies the version of an identification scheme. For schemeVersionID, the Category is Attribute 3016, the Object Class is IdentificationScheme 3028, the Property is Version 3040, the Representation/Association is Identifier 3052, the Type is xsd 3064, the Data-type is token 3076, and the Length is from one to fifteen 3086. The Cardinality between the CCT Identifier 3000 and Scheme-Version ID is zero or one 3091. The schemeVersionID attribute 3004 may be optional (see 3096).

SchemeAgencyID 3006 identifies the agency that manages an identification scheme. The agencies from DE 3055 are used as the default, but in certain embodiments the roles defined in DE 3055 are not used. For schemeAgencyID, the Category is Attribute 3018, the Object Class is Identification-Scheme-Agency 3030, the Property is Identification 3042, the Representation/Association is Identifier 3054, the Type is xsd 3066, the Datatype is token 3078, and the Length is between one to sixty 3087. The Cardinality between the CCT Identifier 3000 and schemeAgencyID 3006 is zero or one 3092. The schemeAgencyID attribute 3006 may be optional (see 3097).

SchemeAgencySchemeID 3008 identifies the identification scheme that represents the context that is used to identify the agency. For schemeAgencySchemeID, the Category is Attribute 3020, the Object Class is IdentificationScheme-Agency 3032, the Property is Scheme 3044, the Representation/Association is Identifier 3056, the Type is xsd 3068, the Datatype is token 3080, and the Length is from one to sixty 3088. The Cardinality between CCT Identifier 3000 and schemeAgencySchemeID 3008 is zero or one 3093. The SchemeAgencySchemeID attribute 3008 may be optional (see 3098).

SchemeAgencySchemeAgencyID 3010 identifies the agency that manages the SchemeAgencySchemeID. This attribute can contain values from DE 3055 (excluding roles). For SchemeAgencySchemeAgencyID, the Category is Attribute 3022, the Object Class is IdentificationScheme-Agency 3034, the Property is SchemeAgency 3046, the Representation/Association is Identifier 3058, the Type is xsd 3070, the Data-type is token 3082, and the Length is three 3089. The Cardinality between the CCT Identifier and SchemeAgencySchemeAgencyID 3010 is zero or one 3099. The SchemeAgencySchemeAgencyID attribute 3010 may be optional (see 3099).

The CCT Identifier 3000 data type is used for elements or attributes that are used in the communication between partners or systems to enable unique identification of logical or real objects. The number of types should not be limited, but continues to grow (e.g., ProductId, OrderId, . . . ). New IDs are continually added.

If the agency that manages the identification scheme is not explicitly identified, but is specified using a role, this is done in the tag name.

Standardized and proprietary identifiers can be represented. For standardized identifiers whose identification schemes are managed by an agency from the DE 3055 code list, schemeID 3002 identifies an identification scheme for the standard identifier, schemeVersionID 3004 identifies a version of the identification scheme, and schemeAgencyID 3006 identifies an agency from DE 3055 (excluding roles). For proprietary identifiers whose identification schemes are managed by an agency that is identified using a standard, schemeID 3002 identifies an identification scheme for the proprietary identifier, schemeVersionID 3004 identifies a version of the identification scheme, schemeAgencyID 3006 identifies a standardized ID for the agency (normally the company that manages the proprietary identifier), schemeAgencySchemeID 3008 identifies an identification scheme for the schemeAgencyID, and schemeAgency-SchemeAgencyID 3010 identifies an agency from DE 3055 that manages standardized ID 'schemeAgencyID'. For proprietary identifiers whose identification schemes are managed by an agency that is identified without the use of a standard, schemeID 3002 identifies an identification scheme for the proprietary identifier, schemeVersionID 3004 identifies a version of the identification scheme, schemeAgencyID 3006 identifies a proprietary ID for the agency (normally the company that manages the proprietary identifier), schemeAgencySchemeID 3008 identifies an identification scheme for the schemeAgencyID, and schemeAgency-SchemeAgencyID 3010 identifies 'ZZZ' which is mutually defined from DE 3055.

For proprietary identifiers whose identification schemes are managed by an agency that is specified using a role or not at all, schemeID 3002 identifies an identification scheme for the proprietary identifier and schemeVersionID 3004 identifies a version of the identification scheme. The role is specified as a prefix in the tag name. If there is more than one identification scheme, schemeID 3002 and schemeVersionID 3004 can be used as attributes. No attributes are required if there is one identification scheme.

The representation term for the CCT "Identifier" is Identifier.

(g) Indicator

A CCT Indicator 3100 is the binary encoded specification of a fact that has the value '0' or '1', i.e., 'true' or 'false'. An example for the CCT Indicator 3100 is: <Indicator>true</Indicator>.

The structure of CCT Indicator 3100 is depicted in FIG. 31. The Category for CCT Indicator 3100 is simpleType 3102, the Property is Indicator 3104, the Representation/Association is Content 3106, the Type is xsd 3108, and the Type Name is Boolean 3110.

CCT Indicator 3100 can have either the value 'true' ('1') or 'false' ('0'). CCT Indicator 3100 is used for binary classifications, indicators, flags, and the like. The representation term for the CCT "Indicator" is Indicator.

(h) Measure

CCT Measure 3200 is a physical measure value with the corresponding measurement unit. One example of CCT Measure 3200 is <Measure unitCode="KG">100</Measure>

The structure of Measure 3200 is depicted in FIG. 32. The Category for CCT Measure 3200 is complex Type 3204, the Property is Measure 3210, the Representation/Association is Content 3214, the Datatype is xsd:decimal 3218, and the length is 13 predecimal digits and 6 decimal values. Measure 3200 also includes attribute unitCode 3202. For Attribute unitCode 3202, the Category is Attribute 3206, the Object Class is Quantity 3206, the Property is Unit 3212, the representation term is Code 3216, the Datatype is xsd:token 3220, the length is 1 to 3 3224, and the Cardinality is one 3226.

Positive and negative quantities can be used by using the built-in data type "xsd:decimal." Negative values may be prefixed with a negative sign ("–"). However, positive values do not require a positive sign "+" prefix. Measurement units are represented in the attribute "unitCode," in accordance with UN/ECE Recommendation #20.

Measure is used for the representation of measure values with physical sizes (meters, centimeters, kilograms). The Representation/Association for the CCT "Measure" is Measure.

Measure should not be confused with Quantity. In contrast to Measure, Quantity is used for the definition of quantity values or units. Quantities can on the one hand be piece sizes, such as packets, containers, and the like. but also physical sizes (meters, centimeters, kilograms).

(i) Numeric

A CCT Numeric 3300 is a decimal value. An example of the CCT Numeric 3300 is:

<Numeric>123.345</Numeric>.

The structure of CCT Numeric 3300 is depicted in FIG. 33. The Category for CCT Numeric 3300 is complexType 3302, the Property is Numeric 3304, the Representation/Association is Content 3306, and the Datatype is xsd:decimal 3308.

Positive and negative numeric values can be used by using the built-in data type "xsd:decimal." Negative values may be prefixed with a negative sign ("–"). However, positive values do not require a positive sign "+" prefix. The decimal sign may be represented as a period (."")

The primary representation term for CCT Numeric 3300 is Numeric. Other secondary representation terms are Value, Rate, and Percent.

In certain embodiments, CCT Numeric 3300 is not used for an indication of quantity, measure or amount.

(j) Quantity

A CCT Quantity 3400 is a quantity with the corresponding quantity unit. An example of the CCT Quantity 3400 is: <Quantity unitCode="CT">100</Quantity>(CT=Carton).

The structure of CCT Quantity 3400 is depicted in FIG. 34. CCT Quantity 3400 includes attribute unitCode 3402. For the CCT Quantity 3400, the Category is Complex Type 3404, the Property is Quantity 3410, the Representation/Association is Content 3414, the Data Type is xsd:decimal 3418, and the Length is thirteen predecimal and six decimal places 3422.

For the Attribute unitCode 3402, the Category is Attribute 3406, the Object Class is Quantity 3406, the Property is Unit 3412, the Representation/Association is Code 3416, the Datatype is xsd:token 3420, and the Length is from one to three 3424. The Cardinality between the CCT Quantity 3400 and unitCode 3402 is one 3426. The attribute unitCode 3402 is mandatory (see 3428).

Positive and negative quantities can be used by using the built-in data type "xsd:decimal." Negative values may be prefixed with a negative sign ("–"). However, positive values do not require a positive sign "+" prefix. Measurement units are represented in the attribute "unitCode," in accordance with UN/ECE Recommendation #20 or X12 355.

CCT Quantity 3400 is used for the representation of quantity values or units. This can involve physical sizes (meters, centimeters, kilograms) or piece sizes, such as packets, containers, and the like. The representation term for the CCT Quantity 3400 is Quantity.

CCT Quantity 3400 should not be confused with Measure. In contrast to Quantity, Measure is used for the definition of physical properties, such as sizes (temperature, lengths, and the like.) and weights of a part, product or article.

(k) Text

A CCT Text 3500 is a character string with an optional language specification. An example for CCT Text 3500 is: <Text languageCode="DE"> Text is a character string with optional language specification.</Text>.

The structure of CCT Text 3500 is depicted in FIG. 35. CCT Text 3500 includes Attribute languageCode 3502. For CCT Text 3500, the Category is complexType 3504, the Property is Text 3508, the Representation/Association is Content 3512, the Type is xsd 3516, the Type Name is string 3520, and the Length is infinity 3524.

If the attachment is a document or text, languageCode 3502 can be used to show the language of the attachment in accordance with IETF RFC 1766 or IETF RFC 3066. For languageCode 3502, the Category is Attribute 3506, the Property is Language 3510, the Type is xsd 3518, the Type Name is language 3522, and the Length is from two to nine 3526. The Cardinality between the CCT Text 3500 and languageCode 3502 is zero or one 3528. Attribute languageCode 3502 may be optional (see 3530).

The primary representation term for the CCT Text 3500 include Amount, BinaryObject, Code, DateTime, Identifier, Indicator, Measure, Numeric, Quantity, and Text. Additional secondary representation terms include Graphic, Picture, Sound, Video, Date, Time, Value, Rate, Percent, and Name. The character length for CCT Text 3500 is not defined.

(2) Global Data Types (a) AcceptanceStatusCode

The GDT AcceptanceStatusCode 3600 is a coded representation of the status of the acceptance by a communication partner regarding a business transaction that has been transmitted to that partner. An example for GDT AcceptanceStatusCode 3600 is:

<AcceptanceStatusCode>AP</AcceptanceStatusCode>.

The structure of GDT AcceptanceStatusCode 3600 is depicted in FIG. 36. For GDT AcceptanceStatusCode 3600, the Property is Acceptance Status Code 3602, the Representation/Association is Code 3604, the Type is CCT 3606, the Type Name is Code 3608, and the Length is two 3610. AcceptanceStatusCode CCT 3600 may be restricted (see 3612).

The possible values for GDT AcceptanceStatusCode 3600 may be a selection from the UN/EDIFACT code list DE 4343. Three codes that may be used are AP, AJ, and RE. AP means the business transaction transmitted by the communication partner has been accepted, AJ means a decision regarding the business transaction transmitted by the communication partner has not (yet) been made, and RE means the business transaction transmitted by the communication partner has been rejected.

GDT AcceptanceStatusCode 3600 may be used as a business status instead of as a technical acknowledgment of a message. GDT AcceptanceStatusCode 3600 also may be used as an immediate response to individual messages in bilateral negotiation processes between communication partners.

In an embodiment, GDT AcceptanceStatusCode 3600 is a proprietary selection from the UN/EDIFACT code list DE 4343. Addition of codes to this selection from the code list may require the approval of the Process Integration Council (PIC).

(b) AccountingObjectSet

A GDT AccountingObjectSet 3700 is a set of different account assignment objects. An account assignment object is a business object to which changes in value from business transactions may be assigned in accounting. An example of GDT AccountingObjectSet 3700 is:

```
<AccountingObjectSet>
    <CostCenterID>CC1000</CostCenterID>
    ...........
</AccountingObjectSet>.
```

The structure of GDT AccountingObjectSet 3700 is depicted in FIG. 37. GDT AccountingObjectSet 3700 includes an element CostCenterID 3702. For GDT AccountingObjectSet 3700, the Object Class is Accounting Object Set 3706 and the Representation/Association is Details 3712.

For CostCenterID 3702, the Category is Element 3704, the Object Class is Cost Center 3708, the Property is Identification 3710, the Representation/Association is identifier 3714, the Type is CCT 3716, the Type is identifier 3718, and the Length is from one to thirty-two 3720. The Cardinality between the GDT AccountingObjectSet 3700 and CostCenterID 3702 is zero or one 3722.

The data type GDT AccountingObjectSet 3700 provides the identifier for multiple types of account assignment objects including cost center (organizational unit for which costs arise), sales order, project, asset, task, funds center, and profit center. Identifiers are optional, but at least one identifier may be specified.

The data type GDT AccountingObjectSet 3700 may be used for account assignment, i.e., to assign an amount or quantity to a set of account assignment objects. The amount or quantity is assigned to account assignment objects of the GDT AccountingObjectSet 3700 according to accounting rules. For example, expenses from the purchase of office materials can be transferred to Accounting once the incoming invoice for the materials has been checked and then assigned to a cost center CC1000 and a profit center PC3050 there.

Applications that distribute an amount to several AccountingObjectSets (e.g., as percentages) may perform this distribution themselves and transfer the partial amounts, each with a separate AccountingObjectSet, to accounting. An example of a percentage distribution to several AccountingObjectSets is 40% to cost center CC1000 and profit center PC3050, 20% to cost center CC2000 and task IO0815, and 40% to cost center CC3000

(c) ActionCode

A GDT ActionCode 3802 is a coded representation of an instruction to the recipient of a message about how to process a transmitted business object.

An example for GDT ActionCode 3802 is:

```
<Item actionCode='04'>
    <ID>10</ID>
    <!--... Further Elements ...-->
</Item>
```

The structure of ActionCode 3802 is depicted in FIG. 38. For GDT ActionCode 3802, the Property is Action 3804, the Representation/Assocation is Code 3806, the Type is CCT 3808, the Type Name is Code, and the Length is two 3812. GDT ActionCode 3802 may be a restricted GDT (see 3814).

In an embodiment, GDT ActionCode 3802 can have a value from 01 to 06. The name for code 01 is Create and means that the element is to be created at the recipient. The element does not exist at the recipient. The element ID and data is transferred. The name for code 02 is Change and means that the element is to be changed at the recipient. The element exists at the recipient. The element ID and data is transferred. The name for the code 03 is Delete and means the element is to be deleted at the recipient. The element exists at the recipient. The element ID is transferred; data is transferred with the exception of elements that are mandatory due to their cardinality. The name for the code 04 is Save and means the element is to be saved at the recipient. The element can exist at the recipient. If the element already exists there, it is changed. If it does not exist there, it is created. The name for code 05 is Remove and means the element is to be deleted at the recipient. The element can exist at the recipient. If it exists, it is deleted. The element ID is transferred; data is not transferred with the exception of elements that are mandatory due to their cardinality. The name for code 06 is No Action and means that no action is to be carried out for the element at the recipient. The element exists at the recipient. The element ID and data is transferred.

ActionCodes may be used under one another in a hierarchy of elements. The following table lists the combinations that may be allowed (X) and not allowed (–).

| | | Parent | | | | | |
|---|---|---|---|---|---|---|---|
| | ActionCode | 01 | 02 | 03 | 04 | 05 | 06 |
| Child | 01 | X | X | — | X | — | — |
| | 02 | — | X | — | X | — | — |
| | 03 | — | X | — | X | — | — |
| | 04 | X(1) | X | — | X | — | X(2) |
| | 05 | — | X | — | X | — | — |
| | 06 | — | X | — | X | — | — |

For the table above, note (1) indicates that the code can have the meaning of the code "01" (Create). Note (2) in the table indicates that, to ensure compatibility with regard to enhancements, code "04" (Save) is allowed because this code is the default code if no code is transferred. A sender preferably does not set this code. A recipient preferably handles this code as a code "06" (No Action).

Also, regarding the table above, no further codes occur under code "03" (Delete) or "05" (Remove) because, apart from the element ID, no further data is transferred. A recipient checks the existence of an element using the rules described for the individual codes and generates an error if necessary. A recipient checks the validity of the codes in a hierarchy of elements according to the rules described and generates an error if necessary. A recipient ignores elements and ActionCodes transferred under a code "03" (Delete) or "05 (Remove) and behaves as if these elements and ActionCodes had not been transferred. A syntax check is allowed for these elements.

The actions requested at the recipient can have names that are typically used in the business context of a message, as long as this does not change the semantics of the ActionCodes defined above. For example, "Annul" or "Cancel" can be used instead of "Delete". An ActionCode is an attribute of the element to which it refers.

The ActionCodes "01" (Create), "02" (Change), "03" (Delete), and "06" (No Action) may model strict semantics that lead to errors at the recipient if the elements corresponding to the actions requested by the sender exist ("01") or do not exist ("02", "03", "06") at the recipient. Using strict semantics, therefore, may require that the sender have and use information about the messages it has already sent. The ActionCodes "04" (Save) and "05" (Remove) model soft semantics that, in an embodiment, do not lead to errors if the respective elements do not exist at the recipient. These soft semantics, therefore, do not require that the sender have and use information about the messages it has already sent. In an embodiment, an ActionCode that is not filled in a message instance or does not exist in an interface may be assumed to be "04" (Save). This ensures compatibility when enhancing interfaces to include an ActionCode.

In some messages, the action at the top level may be represented in the name of the message type rather than by an ActionCode. These messages behave semantically as if the ActionCode were at the level of the transferred BusinessTransactionDocument (for example: a message of the message type PurchaseOrderChangeRequest behaves semantically as if an ActionCode "02" (Change) were specified at the PurchaseOrder level).

An ActionCode may be used with a CompleteTransmissionIndicator for the parent element. For information about the combined use of CompleteTransmissionIndicator and ActionCode, see the description herein for the CompleteTransmissionIndicator. The ActionCode, can also be used for an element whose parent element does not have a CompleteTransmissionIndicator. In this case, the child elements of the parent element are transferred, not just the changed child elements.

The ActionCode may be used for elements that remain uniquely identifiable across several messages in a business process or that can only occur once in a message (cardinality 0.1 or 1). If an element cannot be clearly identified, it is documented explicitly when the ActionCode is used.

In an embodiment, the ActionCodes "03" (Delete) and "05" (Remove) do not stipulate that the recipient delete the respective element physically. However, once the element has been deleted, the recipient application handles further transmitted ActionCodes as if the element has been physically deleted. For example, in the case of the ActionCode "01" (Create), it is possible to create a new element with the same identification as the deleted element. Exceptions to this ActionCode behavior are explained and documented in the corresponding description of the interface or message type.

(d) ActiveIndicator

A GDT ActiveIndicator 3902 indicates whether an object is commercially active and whether it can be used in a process or not. An example of GDT ActiveIndicator 3902 is: <ActiveIndicator>true</ ActiveIndicator>.

The structure of GDT ActiveIndicator 3902 is depicted in FIG. 39. For the GDT ActiveIndicator 3902, the Property is Active Indicator 3904, the Representation/Association is Indicator 3906, and the Type is CCT: Indicator 3908. GDT ActiveIndicator 3902 can have values 1 (true) or 0 (false). True means the object is active and false means the object is not active.

GDT ActiveIndicator 3902 is used to label objects that can be commercially active or inactive, for example, sources of supply. In the context of an interface, there may be a description of which object the GDT ActiveIndicator 3902 refers to and what it means in terms of business.

(e) Address

A GDT Address 4000*a* contains structured information about types of addresses. This information includes details about addressees, the postal address, and the physical location and communication connections.

The structure of GDT Address 4000*a* is depicted in FIG. 40. GDT Address 4000*a* includes elements OrganisationFormattedName 4002*a*, PersonName 4003*a*, FunctionalTitleName 4004*a*, DepartmentName 4005*a*, Office 4006*a*, PhysicalAddress 4012*a*, TaxJurisdictionCode 4036*a*, TimeZoneDifferenceValue 4037*a*, GeoCoordinates 4038*a*, and Communication 4039*a*. For the GDT Address 4000*a*, the Object Class is Address 4000*b* and the Representation/Association is Details 4000*c*.

Within the global data type GDT Address 4000*a*, OrganisationFormattedName 4002*a* contains the name of an organization (for example, a company or corporate body) as a part of the address. For example, this might be the address of a business partner. For OrganisatoinFormattedName 4002*a*, the Category is Element 4002*b*, the Object Class is Address 4002*c*, the Property is Organisation Formatted Name 4002*d*, the Representation/Association is Name 4002*e*, the Type is CCT 4002*f*, the Type Name is text 4002*g*, and the Length is from zero to forty 4002*h*. The Cardinality between the GDT Address 4000*a* and OrganisatoinFormattedName 4002*b* is from zero to four 4003*i*. OrganisationFormattedName may be restricted (see 4002*j*).

PersonName 4003*a* contains the parts of a natural person's name. For PersonName 4003*a*, the Category is Element 4003*b*, the Object Class is Address 4003*c*, the Property is Person Name 4003*d*, the Representation/Association is Person Name 4003*e*, the Type is GDT 4003*f*, and the Type Name is Person Name 4003*g*. The Cardinality between the GDT Address 4000*a* and PersonName 4003*a* is zero or one 4003*h*.

FunctionalTitleName 4004*a* contains the function of a contact person and can be a part of the address of the contact person in the organization. For the FunctionalTitleName 4004*a*, the Category is Element 4004*b*, the Object Class is Address 4004*c*, the Property is Functional Title Name 4004*d*, the Representation/Association is Name 4004*e*, the Type is CCT 4004*f*, the Type Name is Text 4004*g*, and the Length is from zero to forty 4004*h*. The Cardinality between the GDT Address 4000*a* and FunctionalTitleName 4004*a* is zero or one 4004*i*. FunctionalTitleName may be restricted (see 4004*j*).

DepartmentName 4005*a* contains the department of a contact person and can be a part of the address of the contact person in the organization. For the DepartmentName 4005*a*, the Category is Element 4005*b*, the Object Class is Address 4005*c*, the Property is Department Name 4005*d*, the Representation/Association is Name 4005*e*, the Type is CCT 4005*f*, the Type Name is text 4005*g*, and the Length is from zero to forty 4005*h*. The Cardinality between the GDT Address 4000*a* and DepartmentName 4005*a* is zero or one 4005*i*. DepartmentName may be restricted (see 4005*j*).

Office 4006*a* contains information that describes the working environment of a contact person as well as information for addressing or identifying this person within the organization. For Office 4006*a*, the Category is Element 4006*b*, the Object Class is Address 4006*c*, the Property is Office 4006*d*, and the Representation/Association is Details 4006*e*. The Cardinality between the GDT Address 4000*a* and Office 4006*a* is zero or one 4006*f*. Office can also comprise BuildingID 4007*a*, FloorID 4008*a*, RoomID 4009*a*, InhouseMailID 4010*a*, and CorrespondenceShortName 4011*a*.

BuildingID 4007*a* is the number or ID of the building in the address of a contact person. For BuildingID 4007*a*, the Category is Element 4007*b*, the Object Class is Office 4007*c*, the Property is Building Identification 4007*d*, the Representation/Association is Identifier 4007*e*, the Type is CCT 4007*f*, the Type Name is identifier 4007*g*, and the Length is from one to ten 4007*h*. The Cardinality between the GDT Address 4000*a* and BuildingID 4007*a* is zero or one 4007*i*. BuildingID may be restricted (see 4007*j*).

FloorID 4008*a* refers to the floor of the building in the address of a contact person. For FloorID 4008*a*, the Category is Element 4008*b*, the Object Class is Office 4008*c*, the Property is Floor Identification 4008*d*, the Representation/Association ciation is Identifier 4008*e*, the Type is CCT 4008*f*, the Type Name is Identifier 4008*g*, and the Length is from one to ten 4008*h*. The Cardinality between the GDT Address 4000*a* and FloorID 4008*a* is zero or one 4008*i*. FloorID may be restricted (see 4008*j*).

RoomID 4009*a* specifies the room number in the address of a contact person. For RoomID 4009*a*, the Category is Element 4009*b*, the Object Class is Office 4009*c*, the Property is Room Identification 4009*d*, the Representation/Association is Identifier 4009*e*, the Type is CCT 4009*f*, the Type Name is Identifier 4009*g*, and the Length is from one to ten 4009*h*. The Cardinality between the GDT Address 4000*a* and RoomID 4009*a* is zero or one 4009*i*. RoomID may be restricted (see 4009*j*).

InhouseMailID 4010*a* specifies an internal mail address. For InhouseMailID 4010*a*, the Category is Element 4010*b*, the Object Class is Office 4010*c*, the Property is Inhouse Identification 4010*d*, the Representation/Association is Identifier 4010*e*, the Type is CCT 4010*f*, the Type Name is Identifier 4010*g*, and the Length is from one to ten 4010*h*. The Cardinality between the GDT Address 4000*a* and InhouseMailID 4010*a* is zero or one 4010*i*. InHouseMailID may be restricted (see 4010*j*).

CorrespondenceShortName 4011*a* is the short name of the contact person for use in correspondence. This short name can be used both internally and externally. For CorrespondenceShortName 4011*a*, the Category is Element 4011*b*, the Object Class is Office 4011*c*, the Property is Correspondence Short Name 4011*d*, the Representation/Association is Name 4011*e*, the Type is CCT 4011*f*, the Type Name is text 4011*g*, and the Length is from zero to ten 4011*h*. The Cardinality between the GDT Address 4000*a* and CorrespondenceShortName 4011*a* is zero or one 4011*i*. CorrespondenceShortName may be restricted (see 4011*j*).

PhysicalAddress 4012*a* contains the postal address data of a physical location. For the PhysicalAddress 4012*a*, the Category is Element 4012*b*, the Object Class is Address 4012*c*, the Property is Physical Address 4012*d*, and the Representation/Association is Details 4012*e*. The Cardinality between the GDT Address 4000*a* and PhysicalAddress 4012*a* is zero or one 4012*f*.

PhysicalAddress 4012*a* also comprises CountryCode 4013*a*, RegionCode 4014*a*, StreetPostalCode 4015*a*, POBox PostalCode 4016*a*, CompanyPostalCode 4017*a*, CityName 4018*a*, AdditionalCityName 4019*a*, DistrictName 4020*a*, POBoxID 4021*a*, POBoxIndicator 4022*a*, POBoxCountryCode 4023*a*, POBoxRegionCode 4034*a*, POBoxCityName 4035*a*, StreetName 4036*a*, StreetPrefixName 4037*a*, StreetSuffixName 4038*a*, HouseID 4039*a*, AdditionalHouseID 4040*a*, BuildingID 4041*a*, FloorID 4042*a*, RoomID 4043*a*, CareOfName 4044*a*, and Description 4045*a*. For each, the category is Element (4013*b*-4045*b*) and the Object Class is Physical Address (4013*c*-4045*c*).

CountryCode 4013*a* is the country code of the address in accordance with ISO 3166-1. For the CountryCode 4013*a*, the Property is CountryCode 4013*d*, the Representation/Association is Code 4013*e*, the Type is GDT 4013*f*, and the Type Name is CountryCode 4013*g*. The Cardinality between the GDT Address 4000*a* and CountryCode 4013*a* is zero or one 4013*h*.

RegionCode 4014*a* is the code for the region of the country in the address. This specification may be part of the address, e.g., in the US. For RegionCode 4014*a*, the Property is RegionCode 4014*d*, the Representation/Association is Code 4014*e*, the Type is GDT 4014*f*, and the Type Name is RegionCode 4014*g*. The Cardinality between the GDT Address 4000*a* and RegionCode 4014*a* is zero or one 4014*h*.

StreetPostalCode 4015*a* is the zip code in the street address. The rules for zip codes are country-specific. For StreetPostalCode 4015*a*, the Property is Street Zip Code 4015*d*, the Representation/Association is Code 4015*e*, the Type is CCT 4015*f*, the Type Name is Code 4015*g*, and the Length is from one to ten 4015*h*. The Cardinality between GDT Address 4000*a* and StreetPostalCode 4015*a* is zero or one 4015*i*. StreetPostalCode 4015*a* may be restricted (see 4015*j*).

POBoxPostalCode 4016*a* is the box zip code. For POBoxPostalCode 4016*a*, the Property is PO Box Zip Code 4016*d*, the Representation/Association is Code 4016*e*, the Type is CCT 4016*f*, the Type Name is Code 4016*g*, and the Length is from one to ten 4016*h*. The Cardinality between GDT Address 4000*a* and POBoxPostalCode 4016*a* is zero or one 4016*i*. POBoxPostalCode 4016*a* may be restricted (see 4016*j*).

CompanyPostalCode 4017*a* is the zip code of the company when the receiver is an organization with its own zip code. For CompanyPostalCode 4017*a*, the Property is Company Zip Code 4017*d*, the Representation/Association is Code 4017*e*, the Type is CCT 4017*f*, the Type Name is Code 4017*g*, and the Length is from one to ten 4017*h*. The Cardinality between GDT Address 4000*a* and CompanyPostalCode 4017*a* is zero or one 4017*i*. CompanyPostalCode 4015*a* may be restricted (see 4017*j*).

CityName 4018*a* is the name of the city in the address. For the CityName 4018*a*, the Property is City Name 4018*d*, the Representation/Association is Name 4018*e*, the Type is CCT 4018*f*, the Type Name is Text 4018*g*, and the Length is from zero to forty 4018*h*. The Cardinality between GDT Address 4000*a* and CityName 4018*a* is zero or one 4018*i*. CityName 4018*a* may be restricted (see 4018*j*).

AdditionalCityName 4019*a* is the name of the city of residence if it differs from the city in the postal address. AdditionalCityName may have different semantics (field HOME_CITY in the ADRC) and therefore may not be handled using Cardinality. It is analogous to AdditionalHouseID. For AdditionalCityName 4019*a*, the Property is Additional City Name 4019*d*, the Representation/Association is Name 4019*e*, the Type is CCT 4019*f*, the Type Name is Text 4019*g*, and the Length is from zero to forty 4019*h*. The Cardinality between the GDT Address 4000*a* and AdditionalCityName 4019*a* is zero or one 4019*i*. AdditionalCityName 4019*a* may be restricted (see 4019*j*).

DistrictName 4020*a* is the name of the district. For DistrictName 4020*a*, the Property is District Name 4020*d*, the Representation/Association is Name 4020*e*, the Type is CCT 4020*f*, the Type Name is Text 4020*g*, and the Length is from zero to forty 4020*h*. The Cardinality between the GDT Address 4000*a* and DistrictName 4020*a* is zero or one 4020*i*. DistrictName 4020*a* may be restricted (see 4020*j*).

POBoxID 4021*a* is the number of the post-office box. For POBoxID 4021*a*, the Property is PO Box Identification 4021*d*, the Representation/Association is Identifier 4021*e*, the Type is CCT 4021*f*, the Type Name is Identifier 4021*g*, and the Length is from one to ten 4021*h*. The Cardinality between the GDT Address 4000*a* and POBoxID 4021*a* is zero or one 4021*i*. CityName 4021*a* may be restricted (see 4021*j*).

POBoxIndicator 4022*a* specifies whether the post-office box has a number that is unknown. For POBoxIndicator 4018*a*, the Property is PO Box Indicator 4018*d*, the Representation/Association is Indicator 4018*e*, the Type is CCT 4018*f*, and the Type Name is Indicator 4018*g*. The Cardinality between GDT Address 4000*a* and POBoxIndicator 4022 is zero or one 4018*h*.

POBoxCountryCode 4023_a_ is the country code for the post-office box in the address. For POBoxCountryCode 4023_a_, the Property is PO Box Country Code 4023_d_, the Representation/Association is Code 4023_e_, the Type is GDT 4023_f_, and the Type Name is CountryCode 4023_g_. The Cardinality between GDT Address 4000_a_ and POBoxCountryCode 4023_a_ is zero or one 4023_h_.

POBoxRegionCode 4024_a_ is the code for the region of the country for the post-office box in the address. For the POBoxRegionCode 4024_a_, the Property is PO Box Region Code 4024_d_, the Representation/Association is Code 4024_e_, the Type is GDT 4024_f_, and the Type Name is Region Code 4024_g_. The Cardinality between GDT Address 4000_a_ and POBoxRegionCode 4024_a_ is zero or one 4024_h_.

POBoxCityName 4025_a_ is the name of the city for the post-office box in the address. For the POBoxCityName 4025_a_, the Property is PO Box City name 4025_d_, the Representation/Association is Name 4025_e_, the Type is CCT 4025_f_, the Type Name is Text 4025_g_, and the Length is from zero to forty 4025_h_. The Cardinality between GDT Address 4000_a_ and POBoxCityName 4025_a_ is zero or one 4025_i_. POBoxCityName 4025_a_ may be restricted (see 4025_j_).

StreetName 4026_a_ is the name of the street in the address. For the StreetName 4026_a_, the Property is Street name 4026_d_, the Representation/Association is Name 4026_e_, the Type is CCT 4026_f_, the Type Name is Text 4026_g_, and the Length is from zero to sixty 4026_h_. The Cardinality between GDT Address 4000_a_ and StreetName 4026_a_ is zero or one 4026_i_. POBoxCityName 4026_a_ may be restricted (see 4026_j_).

StreetPrefixName 4027_a_ is an additional prefix in the address and precedes the street name in the previous line. For the StreetPrefixName 4027_a_, the Property is Street Prefix Name 4027_d_, the Representation/Association is Name 4027_e_, the Type is CCT 4027_f_, the Type Name is Text 4027_g_, and the Length is from zero to forty 4027_h_. The Cardinality between GDT Address 4000_a_ and StreetPrefixName 4027_a_ is from zero to two 4027_i_. StreetPrefixName 4027_a_ may be restricted (see 4027_j_)

StreetSuffixName 4028_a_ is an additional suffix in the address and comes after the street name in the subsequent line. For the StreetSuffixName 4028_a_, the Property is Street Suffix Name 4028_d_, the Representation/Association is Name 4028_e_, the Type is CCT 4028_f_, the Type Name is Text 4028_g_, and the Length is from zero to forty 4028_h_. The Cardinality between GDT Address 4000_a_ and StreetSuffixName 4028_a_ is from zero to two 4028_i_. StreetPrefixName 4028_a_ may be restricted (see 4028_j_).

HouseID 4029_a_ is the house number for the street in the address. For the HouseID 4029_a_, the Property is House Identification 4029_d_, the Representation/Association is Identifier 4029_e_, the Type is CCT 4029_f_, the Type Name is Identifier 4029_g_, and the Length is from one to ten 4029_h_. The Cardinality between GDT Address 4000_a_ and HouseID 4029_a_ is zero or one 4029_i_. HouseID 4029_a_ may be restricted (see 4029_j_).

AdditionalHouseID 4030_a_ is an addition to the house number, e.g., apartment number. For the AdditionalHouseID 4030_a_, the Property is Additional House Identification 4030_d_, the Representation/Association is Identifier 4030_e_, the Type is CCT 4030_f_, the Type Name is Identifier 4030_g_, and the Length is from one to ten 4030_h_. The Cardinality between GDT Address 4000_a_ and AdditionalHouseID is zero or one 4030_i_. AdditionalHouseID 4030_a_ may be restricted (see 4030_j_).

BuildingID 4031_a_ is the number or abbreviation for a building, e.g., WDF03. For the BuildingID 4030_a_, the Property is Building Identification 4030_d_, the Representation/Association is Identifier 4030_e_, the Type is CCT 4030_f_, the Type Name is Identifier 4030_g_, the Length is from one to twenty 4030_h_. The Cardinality between GDT Address 4000_a_ and BuildingID 4031_a_ is zero or one 4030_i_. BuildingID 4030_a_ may be restricted (see 4030_j_).

FloorID 4032_a_ is the number of the floor in the building. For the FloorID 4032_a_, the Property is Floor Identification 4032_d_, the Representation/Association is Identifier 4032_e_, the Type is CCT 4032_f_, the Type Name is Identifier 4032_g_, and the Length is from one to ten 4032_h_. The Cardinality between GDT Address 4000_a_ and FloorID 4032_a_ is zero or one 4032_i_. FloorID 4032_a_ may be restricted (see 4032_j_).

RoomID 4033_a_ is the number of the room in the building. For the RoomID 4033_a_, the Property is Room Identification 4033_d_, the Representation/Association is Identifier 4033_e_, the Type is CCT 4033_f_, the Type Name is Identifier 4033_g_, and the Length is from one to ten 4033_h_. The Cardinality between GDT Address 4000_a_ and RoomID 4033_a_ is zero or one 4033_i_. RoomID 4033_a_ may be restricted (see 4033_j_).

CareOfName 4034_a_ is a different receiver when the receiver is not the same as the addressee. For the CareofName 4034_a_, the Property is Care of name 4034_d_, the Representation/Association is Name 4034_e_, the Type is CCT 4034_f_, the Type Name is Text 4034_g_, and the Length is from zero to ten 4034_h_. The Cardinality between the GDT Address 4000_a_ and CareOfName 4034_a_ is zero or one 4034_i_. CareofName 4034_a_ may be restricted (see 4034_j_).

Description 4035_a_ is an addition to the address that refers to any special details. For the Description 4030_a_, the Property is Description 4030_d_, the Representation/Association is Text 4030_e_, the Type is GDT 4030_f_, and the Type Name is Description 4030_g_. The Cardinality between GDT Address 4000_a_ and Description 4035_a_ is unbounded 4030_h_.

TaxJurisdictionCode 4036_a_ is the tax jurisdiction code belonging to the address. This code is used in various countries and can normally be derived uniquely from the address. However, it is dependent on the code list of the provider. A country can have multiple code-list providers. For the TaxJurisdictionCode 4036_a_, the Category is Element 4036_b_, the Object Class is Address 4036_c_, the Property is Tax Jurisdiction Code 4036_d_, the Representation/Association is Code 4036_e_, the Type is GDT 4046_f_, and the Type Name is TaxJurisdictionCode 4036_g_. The Cardinality between the GDT Address 4000_a_ and TaxJurisdictionCode 4036_a_ is zero or one 4036_h_.

TimeZoneDifferenceValue 4037_a_ is the difference (in hours) between the local time zone of the location defined by PhysicalAddress 4012_a_ and UTC (Coordinated Universal Time). For the TimeZoneDifferenceValue 4037_a_, the Category is Element 4037_b_, the Object Class is Address 4037_c_, the Property is Time Zone Difference Value 4037_d_, the Representation/Association is Value 4037_e_, the Type is GDT 4037_f_, and the Type Name is TimeZoneDifferenceValue 4037_g_. The Cardinality between the GDT Address 4000_a_ and TimeZoneDifference Value 4037_a_ is zero or one 4037_h_.

GeoCoordinates 4038_a_ contains the geographic data, i.e., longitude and latitude, specified in accordance with the WGS84 reference system, with which a location on the globe can be determined. LatitudeMeasure is the geographic latitude in degrees. LongitudeMeasure is the Geographic longitude in degrees. The measurement unit degrees for each is specified by the attribute "unitCode" Southern latitudes are generally negative and northern latitudes are generally positive. Also, western longitudes are negative and eastern longitudes are positive. Positive values do not require a positive sign (+) for a prefix. However, negative values may have a negative sign (−) for a prefix. The unitCode "DD" corresponds to the unit for the degree of an angle (UN/CEFACT Rec. #20). For the GeoCoordinates 4038*a*, the Category is Element 4038*b*, the Object Class is Address 4038*c*, the Property is GeoCoordinates 4038*d*, the Representation/Association is GeoCoordinates 4038*e*, the Type is GDT 4038*f*, and the Type Name is GeoCoordinates 4038*g*. The Cardinality between the GDT Address 4000*a* and GeoCoordinates 4038*a* is zero or one 4038*h*.

Communication 4049*a* contains information about communication paths with which a person or organization can be reached. For the Communication 4049*a*, the Category is Element 4049*b*, the Object Class is Address 4049*c*, the Property is Communication 4049*d*, and the Representation/Association is Details 4049*e*. The Cardinality between the GDT Address 4000*a* and Communication 4049 is zero or one 4049*f*. Communication 4049*a* is comprised of CorrespondenceLanguageCode 4040*a*, Telephone 4042*a*, MobilePhone 4047*a*, Facsimile 4052*a*, email 4058*a*, and Web 4063*a*.

CorrespondenceLanguageCode 4040*a* specifies the language for written correspondence. For CorrespondenceLanguageCode 4040*a*, the Category is Element 4040*b*, the Object Class is Communication 4040*c*, the Property is Correspondence Language Code 4040*d*, the Representation/Association is Code 4040*e*, the Type is GDT 4040*f*, and the Type Name is LanguageCode 4040*g*. The Cardinality may be zero or one 4040*h*.

Telephone 4042*a* contains one telephone number in each instance. For Telephone 4042*a*, the Category is Element 4042*b*, the Object Class is Communication 4042*c*, the Property is Telephone 4042*d*, and the Representation/Association is Details 4042*e*. The Cardinality between the GDT Address 4000*a* and Telephone 4042*a* is unbounded 4042*f*. Telephone is comprised of Number 4043*a*, NumberDefaltIndicator 4044*a*, NumberDescription 4045*a*, and NumberUsageDenialIndicator 4046*a*.

For Number 4043*a*, the Category is Element 4043*b*, the Object Class is telephone 4043*c*, the Property is Phone Number 4043*d*, the Representation/Assocation is Phone Number 4043*e*, the Type is GDT 4043*f*, and the Type Name is Phone Number 4043*g*. The Cardinality between the GDT Address 4000*a* and Number 4043*a* is one 4043*h*.

NumberDefaultIndicator 4044*a* indicates whether a telephone number is the default number for the address. In certain embodiments, there may be a default telephone number, provided the address contains a telephone number. The default value is "false." For NumberDefaultIndicator 4044*a*, the Category is Element 4044*b*, the Object Class is Telephone 4044*c*, the Property is Number Default Indicator 4044*d*, the Representation/Association is Indicator 4044*e*, the Type is CCT 4044*f*, and the Type Name is Indicator 4044*g*. The Cardinality between the GDT Address 4000*a* and NumberDefaultIndicator 4044*a* is one 4044*h*.

NumberDescription 4045*a* is an addition to the telephone number that refers to special details or that contains other unstructured information. For NumberDescription 4045*a*, the Category is Element 4045*b*, the Object Class is telephone 4045*c*, the Property is Number Description 4045*d*, the Representation/Association is Text 4045*e*, the Type is GDT 4045*f*, and the Type Name is Description 4045*g*. The Cardinality between the GDT Address 4000*a* and NumberDescription 4045*a* is unbounded 4045*h*.

NumberUsageDenial 4046*a* indicates whether the telephone number may be used or not. If this indicator is set to "true," this means that, in accordance with the legal requirements of the respective country, the telephone number may not be used. There are exceptions, however. For example, return calls requested by the business partner or calls made for service purposes may still be permitted. Furthermore, it is advisable to save telephone numbers so that calls from business partners can still be identified, even if this indicator is set. The default is "false." For NumberUsageDenial 4046*a*, the Category is Element 4046*b*, the Object Class is telephone 4046*c*, the Property is Number Usage Denial Indicator 4046*d*, the Representation/Association is Indicator 4046*e*, the Type is CCT 4046*f*, and the Type Name is Indicator 4046*g*. The Cardinality between the GDT Address 4000*a* and NumberUsageDenial 4046*a* is one 4046*h*.

MobilePhone 4047*a* contains a mobile phone number in each instance. For MobilePhone 4047*a*, the Category is Element 4047*b*, the Object Class is Communication 4047*c*, the Property is Mobile Phone 4047*d*, and the Representation/Association is Details 4047*e*. The Cardinality between the GDT Address 4000*a* and MobilePhone 4047*a* is unbounded 4047*f*. MobilePhone 4047*a* is also comprised of Number 4048*a*, NumberDefaultIndicator 4049*a*, NumberDescription 4050*a*, and NumberUsageDenialIndicator 4051*a*.

For Number 4048*a*, the Category is Element 4048*b*, the Object Class is Mobilephone 4048*c*, the Property is Phone Number 4048*d*, the Representation/Association is Phone Number 4048*e*, the Type is GDT 4048*f*, and the Type Name is Phone Number 4048*g*. The Cardinality between the GDT Address 4000*a* and Number 4048*a* is one 4048*h*.

NumberDefaultIndicator 4049*a* indicates whether a mobile phone number is the default mobile phone number for the address. In certain embodiments, there may be a default mobile phone number, provided the address contains a mobile phone number. For NumberDefaultIndicator 4049*a*, the Category is Element 4049*b*, the Object Class is Mobilephone 4049*c*, the Property is Number Default Indicator 4049*d*, the Representation/Association is Indicator 4049*e*, the Type is CCT 4049*f*, and the Type Name is Indicator 4049*g*. The Cardinality between the GDT Address 4000*a* and NumberDefaultIndicator 4049*a* is one 4049*h*.

NumberDescription 4050*a* is an addition to the mobile phone number that refers to special details or that contains other unstructured information. For NumberDescription 4050*a*, the Category is Element 4050*b*, the Object Class is Mobilephone 4050*c*, the Property is Number Description 4050*d*, the Representation/Association is Text 4050*e*, the Type is GDT 4050*f*, and the Type Name is Description 4050*g*. The Cardinality between the GDT Address 4000*a* and NumberDescription 4050*a* is unbounded 4050*h*.

NumberUsageDenialIndicator 4051*a* indicates whether the mobile phone number may be used or not. If this indicator is set to "true," this means that, in accordance with the legal requirements of the respective country, the mobile phone number may not be used. There are exceptions, however. For example, return calls requested by the business partner or calls made for service purposes may still be permitted. Further, mobile phone numbers may be saved so that calls from business partners and the like can still be identified, even if the indicator is set. For NumberUsageDenial 4051*a*, the Category is Element 4051*b*, the Object Class is Mobilephone 4051*c*, the Property is Number Usage Denial Indicator 4051*d*, the Representation/Association is Indicator 4051*e*, the Type is CCT 4051*f*, and the Type Name is Indicator 4051*g*. The Cardinality between the GDT Address 4000*a* and NumberUsageDenialIndicator 4051*a* is one 4051*h*.

Facsimile 4052*a* contains a fax number in each instance. For Facsimile 4052*a*, the Category is Element 4052*b*, the Object Class is Communication 4052*c*, the Property is Facsimile 4052*d*, and the Representation/Association is Details 4052*e*. The Cardinality between the GDT Address 4000*a* and Facsimile 4052*a* is unbounded 4052*f*. Facsimile 4052*a* is also comprised of Number 4053*a*, NumberDefaultIndicator 4054*a*, NumberDescription 4055*a*, and NumberUsageDenialIndicator 4056*a*.

For Number 4053*a*, the Category is E 4053*b*, the Object Class is Facsimile 4053*c*, the Property is Phone Number 4053*d*, the Representation/Associateion is Phone Number 4053*e*, the Type is GDT 4053*f*, the Type Name is Phone Number 4053*g*, and the Cardinality between the GDT Address 4000*a* and Number 4053*a* is one 4053*h*.

NumberDefaultIndicator 4054*a* indicates whether a fax number is the default number for the address. In certain embodiments, there is a default fax number, provided the address contains a fax number. For NumberDefaultIndicator 4054*a*, the Category is Element 4054*b*, the Object Class is Facsimile 4054*c*, the Property is Number Default Indicator 4054*d*, the Representation/Association is Indicator 4054*e*, the Type is CCT 4054*f*, and the Type Name is Indicator 4054*g*. The Cardinality between the GDT Address 4000*a* and NumberDefaultIndicator 4054*a* is one 4054*h*.

NumberDescription 4055*a* is an addition to the fax number that refers to special details or that contains other unstructured information. For NumberDescription 4055*a*, the Category is Element 4055*b*, the Object Class is Facsimile 4055*c*, the Property is Number Description 4055*d*, the Representation/Association is Text 4055*e*, the Type is GDT 4055*f*, and the Type Name is Description 4055*g*. The Cardinality between the GDT Address 4000*a* and NumberDescription 4055*a* is unbounded 4055*h*.

NumberUsageDenial 4056*a* indicates whether the fax number may be used or not. If this indicator is set to "true," this means that, in accordance with the legal requirements of the respective country, the fax number may not be used. There are exceptions, however. For example, response faxes requested by the business partner or faxes sent for service purposes and the like may still be permitted. Furthermore, it is advisable to save fax numbers so that faxes sent by business partners and the like can still be identified, even if the indicator is set. For NumberUsageDenial 4056*a*, the Category is Element 4056*b*, the Object Class is Facsimile 4056*c*, the Property is Number Usage Denial Indicator 4056*d*, the Representation/Association is Indicator 4056*e*, the Type is CCT 4056*f*, and the Type Name is Indicator 4056*g*. The Cardinality between the GDT Address 4000*a* and NumberUsageDenial 4056*a* is one 4056*h*.

Email 4058*a* contains an email address in each instance. For Email 4058*a*, the Category is Element 4058*b*, the Object Class is Communication 4058*c*, the Property is Email 4058*d*, and the Representation/Association is Details 4058*e*. The Cardinality between the GDT Address 4000*a* and Email 4058*a* is unbounded 4058*h*. Email 4058 also comprises Address 4059*a*, AddressDefaultIndicator 4060*a*, AddressDescription 4061*a*, and AddressUsageDenialIndicator 4062*a*.

Address 4059*a* specifies the email address. For Address 4059*a*, the Category is Element 4059*b*, the Object Class is Email 4059*c*, the Property is Email Address 4059*d*, the Representation/Association is Email Address 4059*e*, the Type is GDT 4059*f*, and the Type Name is Email Address 4059*g*. The Cardinality between the GDT Address 4000*a* and Address 4059*a* is one 4053*h*.

AddressDefaultIndicator 4060*a* indicates whether an email address is the default email address for this address. There may be a default email address, provided there are any email addresses for this address. For AddressDefaultIndicator 4060*a*, the Category is Element 4060*b*, the Object Class is Email 4060*c*, the Property is Email Address Default Indicator 4060*d*, the Representation/Association is Indicator 4060*e*, the Type is CCT 4060*f*, and the Type Name is Indicator 4060*g*. The Cardinality between the GDT Address 4000*a* and AddressDefaultIndicator 4060*a* is one 4060*h*.

AddressDescription 4061*a* is an addition to the email address that refers to special details or that contains other unstructured information. For AddressDescription 4061*a*, the Category is Element 4061*b*, the Object Class is Email 4061*c*, the Property is Email Address Description 4061*d*, the Representation/Association is Text 4061*e*, the Type is GDT 4061*f*, and the Type Name is Description 4061*g*. The Cardinality between the GDT Address 4000*a* and AddressDescription 4061*a* is unbounded 4061*h*.

AddressUsageDenialIndicator 4062*a* indicates whether the e-mail address may be used or not. If this indicator is set to "true," this means that, in accordance with the legal requirements of the respective country, the email address may not be used. There are exceptions, for example, responses to email enquiries may still be permitted. Furthermore, email addresses may be saved so that emails sent by business partners and the like can still be identified, even if the indicator is set. For AddressUsageDenialIndicator 4062*a*, the Category is Element 4062*b*, the Object Class is Email 4062*c*, the Property is Email address Usage Denial Indicator 4062*d*, the Representation/Association is Indicator 4062*e*, the Type is CCT 4062*f*, and the Type Name is Indicator 4062*g*. The Cardinality between the GDT Address 4000*a* and AddressUsageDenialIndicator 4062*a* is one 4062*h*.

Web 4063*a* contains a Web address in each instance. For Web 4063*a*, the Category is Element 4063*b*, the Object Class is Communication 4063*c*, the Property is Web 4063*d*, and the Representation/Association is Details 4063*e*. The Cardinality between the GDT Address 4000*a* and Web 4063*a* is unbounded 4063*f*. Web 4063*a* is also comprised of Address 4064*a*, AddressDefaultIndicator 4065*a*, and AddressDescription 4066*a*.

Address 4064*a* specifies the URI of a Web site. The length is long enough to accommodate a generated URI. For Address 4064*a*, the Category is Element 4064*b*, the Object Class is Web 4064*c*, the Property is Web Address 4064*d*, the Representation/Association is Address 4064*e*, the Type is GDT 4064*f*, and the Type Name is Web Address 4064*g*. The Cardinality between the GDT Address 4000*a* and Address 4064*a* is one 4064*h*.

AddressDefaultIndicator 4065*a* indicates whether a Web address is the default Web address for this address. There may be a default Web address, provided the address contains a Web address. For AddressDefaultIndicator 4065*a*, the Category is Element 4065*b*, the Object Class is Web 4065*c*, the Property is Address Default Indicator 4065*d*, the Representation/Association is Indicator 4065*e*, the Type is CCT 4065*f*, and the Type Name is Indicator 4065*g*. The Cardinality between the GDT Address 4000*a* and AddressDefaultIndicator 4065*a* is one 4065*h*.

Address Description 4066*a* is an addition to the Web address that refers to special details or that contains other unstructured information. For AddressDescription 4066*a*, the Category is Element 4066*b*, the Object Class is Web 4066*c*, the Property is Address Description 4066*d*, the Representation/Association is Text 4066*e*, the Type is GDT 4066*f*, and the Type Name is Description 4066*g*. The Cardinality between the GDT Address 4000*a* and Address Description 4066*a* is unbounded 4066*h*.

An example of GDT Address 4000a is:

```
<Address>
  <OrganisationFormattedName>Systems, Applications
and Products</OrganisationFormattedName>
  <OrganisationFormattedName>in Data
Processing</OrganisationFormattedName>
  <PersonName>
    <FormattedName>Mr. Paul John Tester</FormattedName>
    <LegalName>Paul John Tester</LegalName>
    <GivenName></GivenName>
    <PreferredGivenName>Paul</PreferredGivenName>
    <MiddleName>John</MiddleName>
    <Family>
      <FamilyName>Tester</FamilyName>
      <PrimaryIndicator>true</PrimaryIndicator>
      <FamilyNamePrefix></FamilyNamePrefix>
    </Family>
    <Affix>
      <AffixName>Mr.</AffixName>
      <AffixCode>FormOfAddress</AffixCode>
    </Affix>
  </PersonName>
  <FunctionalTitleName>Sales Manager</FunctionalTitleName>
  <DepartmentName>Sales Department</DepartmentName>
  <Office>
    <BuildingID>WDF01</BuildingID>
    <FloorID>2</FloorID>
    <RoomID>G2.01</RoomID>
    <InhouseMailID>SCM IBD 2</InhouseMailID >
    <CorrespondenceShortName>TeP</CorrespondenceShortName>
  </Office>
  <PhysicalAddress>
    <CountryCode>MX</CountryCode>
    <RegionCode>DIF</RegionCode>
    <StreetPostalCode>01210</StreetPostalCode>
    <CityName>Mexico</CityName>
    <DistrictName> Santa Fé </DistrictName>
    <StreetName>Piso Col Pena Blanca</StreetName>
    <StreetPrefixName>Edificio Plaza Reforma Santy
Fé</StreetPrefixName>
    <StreetPrefixName>Prologacion Paseo de la
Reforma</StreetPrefixName>
    <HouseID>No 600-2°</HouseID>
  </PhysicalAddress>
  <TaxJurisdictionCode listID=“,” listVersionID=“,” listAgencyID =“,”
listAgencySchemeID=“,”listAgencySchemeAgencyID=
“”>123456789101112
</TaxJurisdictionCode>
  <TimeZoneDifferenceValue>+08:00</TimeZoneDifferenceValue>
  <GeoCoordinates>
    <LatitudeMeasure unitCode=“DD”>40.23232300000</
    LatitudeMeasure>
    <LongitudeMeasure
unitCode=“DD”>123.12121200000</LongitudeMeasure>
  </GeoCoordinates>
  <Communication>
    <Telephone>
      <TelephoneNumber>
        <AreaID>6227</AreaID>
        <SubscriberID>7</SubscriberID>
        <ExtensionID>47474</ExtensionID>
        <CountryCode>DE</ CountryCode>
      </TelephoneNumber>
      <TelephoneNumberDefaultIndicator>1
</TelephoneNumberDefaultIndicator>
      <Description></ Description>
      <UsageDenialIndicator>0</UsageDenialIndicator>
    </Telephone>
    <MobilePhone>
    <MobilePhoneNumber>
      <AreaID>170</AreaID>
      <SubscriberID>1234567</SubscriberID>
      <ExtensionID></ExtensionID>
      <CountryCode>DE</ CountryCode >
    </MobilePhoneNumber>
    <MobilePhoneNumberDefaultIndicator>1
</MobilePhoneNumberDefaultIndicator>
      <Description></Description>
      <UsageDenialIndicator>0</UsageDenialIndicator>
    </MobilePhone>
    <Facsimile>
      <FacsimileNumber>
        <AreaID>6227</AreaID>
        <SubscriberID>78</SubscriberID>
        <ExtensionID>99999</ExtensionID>
        <CountryCode>DE</ CountryCode >
      </FacsimileNumber>
      <FacsimileNumberDefaultIndicator>1
</FacsimileNumberDefaultIndicator>
      <Description>Secretary</Description>
      <UsageDenialIndicator>0</UsageDenialIndicator>
    </Facsimile>
    <EmailAddress>paul.tester@sap.com</EmailAddress>
<EmailAddressDefaultIndicator>1</EmailAddressDefaultIndicator>
      <Description></Description>
      <UsageDenialIndicator>0</UsageDenialIndicator>
    <Web>
      <WebAddress>http://www.sap.com</WebAddress>
      <WebAddressDefaultIndicator>1</WebAddressDefaultIndicator>
      <Description>Official information</Description>
    </Web>
  </Communication>
</Address>.
```

This example address produces the following result, which can be printed out for a label:

Systems, Applications and Products
in Data Processing
Mr. Paul John Tester
Sales Manager
Edificio Plaza Reforms Santa Fé
Prolongacion Paseo de la Reforma
No. 600-2°Piso Col Pena Blanca
Santa Fé01210
Mexico, DIF.

Note that some fields, such as TaxJurisdictionCode and TimeZoneValueDifference, may not be used even if they have been completed. If BuyerParty is an organization then PersonName may be empty. If BuyerParty is a natural person then OrganisationFormattedName may be empty.

The addresses of technical objects, which describe a physical location, are represented by an appropriate field selection, e.g., the address of the organization without OrganisationFormattedName and Communication.

(f) AdjustmentReasonCode

The GDT AdjustmentReasonCode 4100 is a coded representation for the reason for an adjustment. An example of GDT AdjustmentReasonCode 4100 is:

<AdjustmentReasonCode>CANCELED_PROMOTION</AdjustmentReasonCode>.

The structure of GDT AdjustmentReasonCode 4100 is depicted in FIG. 41.

The illustrative code is general and can be used in many contexts. The standard code list to be used in an interface depends on the particular context. In an embodiment, a standard code list is used. If an interface supports one of the lists or if the supported code lists are disjunctive, none of the attributes may be required for identification of the particular standard code lists.

For the use of GDTs in revisions of forecast time series, the possible code values are subsets of the “Adjustment Reason Code List” of the “EAN.UCC XML Business Message Standards, version 1.3 (July 2003).” These include CANCELED_PROMOTION, DISCONTINUED_PRODUCT, DISTRIBUTION_ISSUE, EXPANDED_PROMOTION, FORWARD_BUY, INVENTORY_POLICY_CHANGE, NEW_LOCATION, NEW_PRODUCT, NEW_PROMOTION, ORDER_POLICY_CHANGE, OVERSTOCK_CONDITION, PRICE_CHANGE, PRODUCT_CHANGEOVER, PRODUCTION_ISSUE, REDUCED_PROMOTION, REVISED_PLAN, REVISED_PROMOTION, STORE_CLOSURE, TRANSPORTATION_ISSUE and WEATHER_RELATED_EVENT. For each use of the above, the context and code list used may be documented.

(g) AllowedIndicator

A GDT AllowedIndicator 4200 indicates whether something, such as a specific procedure, operation or status, is allowed or not. An example of GDT AllowedIndicator 4200 is: <LowerCaseAllowedIndicator>true</LowerCaseAllowedIndicator>.

The structure of GDT Allowed Indicator 4200 is depicted in FIG. 42. For the GDT Allowed Indicator 4200, the Property is Allowed 4202, the Representation/Association is Indicator 4204, the Type is CCT 4206, and the Type Name is Indicator 4208.

The GDT AllowedIndicator 4200 can have the values true or false. True means that something is allowed while false means that something is not allowed. For each GDT AllowedIndicator 4200, what is allowed or not allowed may be indicated precisely. This is reflected in an appropriate name prefix. For example, a NegativeValueAllowedIndicator specifies whether negative numeric values are allowed, while a LowerCaseAllowedIndicator specifies whether lower-case letters are allowed.

The GDT AllowedIndicator 4200 may be used to indicate whether a customer is allowed to submit an online purchase order in lower-case letters. In the context of an interface, the business significance of "what is allowed" may be described for the AllowedIndicator in addition to using the name prefix.

(h) Amount

A GDT Amount 4300 is an amount with the corresponding currency unit. An example of GDT Amount 4300 is: <OrderedAmount currencyCode="EUR">777.95</OrderedAmount>.

The structure of GDT Amount 4300 is depicted in FIG. 43. For the GDT Amount 4300, the Property is Amount 4302, the Representation/Association is Amount 4304, the Type is CCT 4306, and the Type Name is Amount 4308.

GDT Amount 4300 is used to represent amounts, costs, remunerations, and fees. The amount value in GDT Amount 4300 may be represented with a maximum of 22 predecimal places and 6 decimal places. Both positive and negative amounts can be used. Amount 4300 may also include the attribute currencyCode which refers to the currency unit in accordance with the ISO 4217 three-character code. A currency may be specified.

(i) AmountBalanceIndicator

A GDT AmountBalanceIndicator 4400 indicates whether an amount is a balance or not. An example of GDT AmountBalanceIndicator 4400 is:
<AmountBalanceIndicator>true</AmountBalanceIndicator>.

The structure of GDT AmountBalanceIndicator 4400 is depicted in FIG. 44. For the GDT AmountBalanceIndicator 4400, the Property is Amount Balance 4402, the Representation/Association is Indicator 4404, the Type is CCT 4406, and the Type Name Indicator is 4408.

BalanceIndicator can have either the value true or false. True signifies that the amount specified is a balance. False signifies that the amount specified is not a balance. GDT Amount 4400 can be used to indicate whether the balance of all open receivables is transferred in a message to a party or whether the amount transferred is an individual receivable. A balance amount may also be positive or negative. In the context of an interface, the amount to which the GDT Amount 4400 refers and the business significance of the balance may be described.

(j) AspectID

A GDT AspectID 4500 is a unique identifier for an aspect. An aspect determines a selection of attributes relevant for the aspect for a predefined object type. An example of GDT AspectID 4500 is: <AspectID>DETAIL</AspectID>.

The structure of GDT AspectID 4500 is depicted in FIG. 45. For the GDT AspectID 4500, the Object Class is Aspect 4502, the Property is Identification 4504, the Representation/Association is Identifier 4506, the Type is CCT 4508, the Type Name is Identifier 4510 and the length is from one to forty 4512.

In one embodiment, when a catalog is published, a GDT AspectID 4500 can be used as the CatalogueItemAspectID to specify which properties (and their values) are to be displayed in the view for a catalog item. For example, in a product catalog, the "LIST" aspect contains those product properties that are required to select a product from a list quickly. The "DETAIL" aspect contains all the properties, while the "COMPARISON" aspect contains those that are useful for comparing the details of two products.

A distinction should also be made between an aspect and a "view." A view of a predefined object is a restriction of the object's attributes. An aspect is a semantic criterion that is used to decide which attributes belong to a particular object view. When a given aspect is applied to various object types, the result is a view. For this reason, an aspect usually has many different views.

(k) Attachment

A CCT Attachment 4600 is an arbitrary document type that is related to either the whole message or just a particular part. An example of CCT Attachment 4600 is: <Attachment id="sampleAttachment.xml">Some Attachment</Attachment>.

The structure of CCT Attachment 4600 is depicted in FIG. 46. The CCT Attachment 4600 includes attributes id 4612 and filename 4632. For the CCT Attachment 4600, the Property is Attachment 4602, the Representation/Association is Binary Object 4604, the Type is xsd 4606, the Type Name is normalizedString 4608. The CCT Attachment 4600 is Title 4610.

Attribute id 4612 uniquely identifies the binary content within the message that corresponds to the SOAP or ebXML messaging protocols. For the CCT Id 4612, the Category is Attribute 4614, the Object Class is Attachment 4616, the Property is Identification 4618, the Representation/Association is Identifier 4620, the Type is xsd 4622, the Type Name is string 4624, the Length is from one to thirty five 4626, the Cardinality is one 4628. The CCT Id 4612 may be unique as used for references using the manifest 4630.

Attribute filename 4632 contains the relevant name or file name of the binary content. The structure of CCT Filename 4632 is depicted in FIG. 46. For the CCT Filename 4632, the Category is Attribute 4634, the Object Class is Attachment 4636, the Property is Filename 4638, the Representation/Association is Text 4640, the Type is xsd 4642, the Type Name is String 4644, the length is up to seventy 4646, and the Cardinality is zero or one 4648.

The element value of CCT BinaryObject 4600 is based on the XML-scheme-specific built-in data type xsd: normalizedString and can be used to represent an intelligible title or name of the binary object.

The attachment may be sent in the same message in the form of a MIME attachment. The technical referencing is done using the manifest of the respective message protocol (SOAP or ebXML messaging). The value from the "id" attribute is used as the referencing code. Every attachment may have this attribute and the identifiers may be unique in the same document instance.

Attachments are similar to the attachments in electronic message transfer (for example, STMP). The attachments may be documents that can be read by humans, such as word-processing documents, spreadsheet documents, presentation documents, and the like. These documents can be in many different formats (e.g., doc, pdf, ppt, xls, and the like.).

The binary data streams of Attachment should not be stored on a Web server as a file. The global data type "WebAddress" is available for this purpose.

(l) AttachmentWebAddress

A CDT AttachmentWebAddress 4700 is a Web address for a document of any type that is related to the transmitted message or part of the message, but is not itself transmitted as part of the message. An example of CDT AttachmentWebAddress 4700 is:

<AttachmentWebAddress>http://www.abc.com/Attachments/HelloWorld.txt</AttachmentWebAddress>.

The structure of CDT AttachmentWebAddress 4700 is depicted in FIG. 47. For the CDT Attachment Web Address 4700, the Object Class Qualification is Attachment 4702, the Object Class is Web Address 4704, the Property is Address 4706, the Representation/Association is Electronic Address 4708, the Type is GDT 4710,and the Type Name is Web Address 4712.

The specification of an CDT AttachmentWebAddress 4700 may support http and https URI schemes. The CDT AttachmentWebAddress 4700 may also be used to transmit a link to an attachment, instead of transmitting the attachment itself. The recipient can use the transmitted link to access the attachment.

When using an CDT AttachmentWebAddress 4700 in an interface or GDT, how the link is to be interpreted may be described. For example, as a simple link to enable the user to display the attachment on the interface, as a request to the recipient system to load the attachment from the specified address as soon as possible, whether there are restrictions on how long the attachment is available at the specified URL, or whether and by whom the attachment can be changed.

(m) BatchID

A GDT BatchID 4800 is a unique identifier for one batch in the context of a material number. Batches are non-reproducible, homogenous subsets of a product, whose characteristics lie within the batch characteristics defined for the product. An example of GDT BatchID 4800 is: <BatchID> CH20021015</BatchID >.

The structure of GDT BatchID 4800 is depicted in FIG. 48. For the GDT BatchID 4800, the Category is Complex Type 4802, the Object Class is Batch 4804, the Property is Identification 4806, the Representation/Association is Identifier 4808, the Type is CCT 4810, the Data Type is Identifier 4812, the Length is from one to ten 4814.

The GDT BatchID 4800 may comprise letters, numbers, and displayable special characters, with the possible exception of "*," "&," and, "". The identifier may be uppercase and the GDT BatchID 4800 may not begin with blank characters or contain consecutive blank characters. The GDT BatchID 4800 value range includes combinations of the permitted characters up to a maximum length of 10 characters.

SchemeID identifies an identification scheme. The identification scheme represents the context that is used to identify an object. SchemeID may be unique within the agency that manages this identification scheme. The structure of GDT schemeID 4816 is depicted in FIG. 48. For the GDT schemeID 4816, the Category is Attribute 4818, the Object Class is Identification Scheme 4820, the Property is Identification 4822, the Representation/Association is Identifier 4824, the Type is xsd 3126, the Data Type is Token 4828, the Cardinality is zero or one 4830. The GDT schemeID 4816 may be Optional 4832.

SchemeVersionID identifies the version of an identification scheme. The structure of GDT schemeVersionID 4834 is depicted in FIG. 48. For the GDT schemeVersionID 4834, the Category is Attribute 4836, the Object Class is Identification Scheme 4838, the Property is Version 4840, the Representation/Association is Identifier 4842, the Type is xsd 4844, the Data Type is Token 4846, and the Cardinality is zero or one 4848. The GDT schemeVersionID 4834 may be optional 4850.

SchemeAgencyID identifies the agency that manages an identification scheme. The agencies from DE 3055 may be used as the default, but the roles defined in DE 3055 may not be used. GDT BatchID 4800 may be unique within the identification scheme that is managed by schemeAgencyID. For the GDT schemeAgencyID 4852, the Category is Attribute 4854, the Object Class is IdentificationSchemeAgency 4856, the Property is Identification 4858, the Representation/Association is Identifier 4860, the Type is xsd 4862, the Data Type is Token 4864, and the Cardinality is zero or one 4866. The GDT schemeAgencyID 4852 may be optional 4868.

SchemeAgencySchemeID identifies the identification scheme that represents the context for agency identification. For the GDT schemeAgencySchemeID 4870, the Category is Attribute 4872, the Object Class is IdentificationSchemeAgency 4874, the Property is Scheme 4876, the Representation/Association is Identifier 4878, the Type is xsd 4880, the Data Type is Token 4882, and the Cardinality is zero or one 4884. The GDT schemeAgencySchemeID 4870 may be optional 4886.

SchemeAgencySchemeAgencyID identifies the agency that manages the SchemeAgencySchemeID. This attribute may contain values from DE 3055 (excluding roles). For the GDT schemeAgencySchemeAgencyID 4888, the Category is Attribute 4890, the Object Class is IdentificationSchemeAgency 4892, the Property is SchemeAgency 4894, the Representation/Association is Identifier 4896, the Type is xsd 4898, the Data Type is Token 4899, and the Cardinality is zero or one 4801A. The GDT schemeAgencySchemeAgencyID 4888 may be optional 4802A.

The GDT BatchID 4800 may be used to identify batches. Specifying attributes may be optional. By default, the system may assume that the batch identified by the GDT BatchID 4800 is a manufacturer batch and therefore no attributes are required.

(n) BiddingConditionCode

The GDT BiddingConditionCode 4900 is a coded representation of the bidding conditions for a bid invitation property. An example of GDT BiddingConditionCode 4900 is:

<QuoteQuantityBiddingConditionCode>01</QuoteQuantityBiddingConditionCode>.

The structure of GDT Bidding Condition Code 4900 is depicted in FIG. 49. For the GDT Bidding Condition Code 4900, the Object Class is Bidding 4902, the Property is Condition 4904, the Representation/Association is Code 4906, the Type is CCT 4908, the Type Name is Code 4910, and the Length is two 4912.

The GDT BiddingConditionCode 4900 may have the values 01 through 04. 01 means that a bid is mandatory for a bid invitation property, and the property valuation may not be changed. 02 means a bid is mandatory for a bid invitation property, and the property valuation can be changed. 03 means a bid may be optional for a bid invitation property, and the property valuation cannot be changed. 04 means a bid may be optional for a bid invitation property, and the property valuation can be changed Illustrative bid invitation properties for which bidding conditions can be specified may include quantity, price, and terms of delivery. When the GDT BiddingConditionCode 4900 is applied to a bid invitation property, it is identified in the prefix, e.g., QuoteQuantityBiddingConditionCode. A default procedure should be specified for each usage of a GDT BiddingConditionCode 4900.

The GDT BiddingConditionCode 4900 may be a proprietary code list with fixed predefined values. Changes to the permitted values may involve changes to the interface.

(o) BusinessDocumentMessageHeader

A GDT BusinessDocumentMessageHeader 5000 comprises business information from the perspective of the sender application for identifying a business document within a message (if applicable, with a reference to a previous instance of a business document within a previous message), information about the sender, and any information about the receiver. An example of GDT BusinessDocumentMessageHeader 5000 is:

```
<PurchaseOrderRequest>
  <MessageHeader>
    <ID schemeID="INVOIC">00000000123456</ID>
    <ReferenceID schemeID="ORDER">00000000123455</
    ReferenceID>
    <CreationDateTime>2003-10-21T12:21Z+01:00</ID>
    <SenderParty>
      <StandardID schemeAgencyID="016">4711</StandardID>
      <ContactPerson>
        <InternalID schemeID="PartyID"
schemeAgencyID="MPL_002">820</InternalID>
        <Address>...</Address>
      </ContactPerson>
    </SenderParty>
    <RecipientParty>
      <InternalID schemeID="PartyID"
schemeAgencyID="BPL_300">747</InternalID>
      <ContactPerson>
        <InternalID schemeID="PartyID"
schemeAgencyID="BPL_300">737</InternalID>
        <Address>...</Address>
      </ContactPerson>
    </RecipientParty>
  </MessageHeader>
  ....
</PurchaseOrderRequest>.
```

The structure of GDT Business Document Message Header 5000 is depicted in FIG. 50. The GDT Business Document Message Header 5000 includes elements ID 5010, ReferenceID 5028, CreationDateTime 5046, SenderParty 5062, and RecipientParty 5078. For the GDT Business Document Message Header 5000, the Object Class is Business Document Message 5002, the Property is Header 5004, the Representation/Association is Details 5006, the Type is GDT 5008.

ID 5010 is the identifier for the instance of the business document within a (technical) message that is generated by the business application level at the sender. For the ID 5010, the Category is Element 5012, the Object Class is Business Document Message 5014, the Property is Identification 5016, the Representation/Association is Identifier 5018, the Type is GDT 5020, the Type Name is Business Document Message ID 5022, the Length is from one to thirty-five 5024, and Cardinality is zero or one 5026.

ReferenceID 5028 is the identifier of another instance of a business document in another (technical) message that the BusinessDocument references (a BusinessDocument can link to another BusinessDocumentMessage to represent a business interrelation or a dependency). For the Reference ID 5028, the Category is Element 5030, the Object Class is Business Document Message 5032, the Property is Reference Identification 5034, the Representation/Association is Identifier 5036, the Type is GDT 5038, the Type Name is Business Document Message ID 5040, the Length is from one to thirty-five 5042, and the Cardinality is zero or one 5044.

CreationDateTime 5046 is a date and time stamp (to the second) for when a message is created for the business document within the business application. For the GDT Creation Date Time 5046, the Category is Element 5048, the Object Class is Business Document Message 5050, the Property is Creation Date Time 5052, the Representation/Association is Date Time 5054, the Type is GDT 5056, the Type Name is Date Time 5058, the Cardinality is one 5060.

SenderParty 5062 is the party that creates and sends the BusinessDocument at business application level. SenderParty contains a unique sender identification. The identifiers contained in SenderParty can also be used for internal forwarding at application level. The contact person in it contains the necessary direct contact information in case there are problems or errors during processing of the respective BusinessDocument. For the GDT Sender Party 5062, the Category is Element 5064, the Object Class is Business Document Message 5066, the Property is Sender 5068, the Representation/Association is Party 5070, the Type is GDT 5072, the Type Name is Business Document Message Header Party 5074, the Cardinality is zero or one 5076.

RecipientParty 5078 is the party that receives and processes the BusinessDocument at business application level. RecipientParty may contain a unique receiver identification. The identifiers contained in RecipientParty can also be used for internal forwarding at application level. The contact person in it contains the contact information in case there are problems or errors during processing of the respective BusinessDocument. The structure of GDT Recipient Party 5078 is depicted in FIG. 50. For the GDT Recipient Party 5078, the Category is Element 5080, the Object Class is Business Document Message 5082, the Property is Recipient 5084, the Representation/Association is Party 5086, the Type is GDT 5088, the Type Name is Business Document Message Header Party 5090, the Cardinality is from zero to n 5092.

BusinessDocuments used for B2B scenarios may use the GDT BusinessDocumentMessageHeader 5000. If required, GDT BusinessDocumentMessageHeader 5000 can also be used in BusinessDocuments intended for A2A scenarios.

GDT BusinessDocumentMessageHeader 5000 may be used for numerous purposes. For example, GDT BusinessDocumentMessageHeader 5000 may be used for forwarding to the relevant position or target person within a business application, for tracing and monitoring of a BusinessDocument and its processing status at business application level, and for managing and monitoring business processes.

GDT BusinessDocumentMessageHeader 5000 may also be used for administration and error handling. The unique identification can be used for referencing and in the case of errors at business application level, the contact person in SenderParty or RecipientParty can be contacted directly. The name, telephone number, e-mail address, fax number, and the like. can be transmitted by the GDT BusinessDocumentMessageHeader 5000 for this purpose.

GDT BusinessDocumentMessageHeader 5000 may also be used for converting general information to other standards, such as IDoc, UN/CEFACT, ANSI X.12, ODETTE, TRADACOMMS, xCBL, OAG BODs, and RosettaNet-PIPs. These are standards that represent reference data for the business application level according to predefined conventions. In an embodiment, this may be guaranteed if the general header information of a BusinessDocument is identical to the envelope or header information of the respective default message.

The ReferenceID is used to represent references that originate from the succession of BusinessDocuments in the BusinessDocument choreography. This may include query/response or request/confirmation messages. The respective interface document may identify the previous BusinessDocument to which the ReferenceID refers, i.e., what the reference specified by the BusinessDocument reference means.

Comparing GDT BusinessDocumentMessageHeader 5000 to the header information from the message transfer protocols such as "Reliable Messaging," "OASIS ebXML MSG," "OASIS ebXML CPP/CPA," and "Rosetta Net RNIF 2.0," demonstrates that the GDT BusinessDocumentMessageHeader 5000 may contain redundant information compared to these technical transfer protocols. However, the GDT BusinessDocumentMessageHeader 5000 may be used at business application level instead of at a technical level. The information in this case is information that can be sent, received, and processed at this level.

GDT BusinessDocumentMessageHeader 5000 may be based on UN/CEFACT Standard BusinessDocumentMessage Header Technical Specification—Working Draft—Revision 2.2.5" dated 26 Nov. 2003. The ID (BusinessDocumentMessageID) of the GDT BusinessDocumentMessageHeader 5000 may be distinguishable from the technical Messaged (the XI message). Specifically the BusinessDocumentMessageID is issued by the business application and is stable over the entire lifetime of the BusinessDocument. It also remains unchanged even when the message is sent via multiple, successive middleware systems. The technical Messaged is issued at the level of the technical middleware system and generally changes each time the BusinessDocument is resent or forwarded by a middleware system and when the BusinessDocument is split into multiple technical messages by a middleware system.

(p) BusinessDocumentMessageHeaderParty

A GDT BusinessDocumentMessageHeaderParty 5100 is information about a party that is responsible for sending or receiving a BusinessDocument at a business application level. GDT BusinessDocumentMessageHeaderParty 5100 contains the necessary general business information about an involved sender or receiver party. A party is typically a natural person, organization, or business partner group in which a company has a business or intra-enterprise interest. This could be a person, organization, or group within or outside of the company. An example of GDT BusinessDocumentMessageHeaderParty 5100 is:

```
<PurchaseOrderRequest>
  <MessageHeader>
    <SenderParty>
      <StandardID schemeAgencyID="016">4711</StandardID>
      <ContactPerson>
        <InternalID schemeID="PartyID"
schemeAgencyID="MPL__002">820</InternalID>
        <Address>...</Address>
      </ContactPerson>
    </SenderParty>
```

-continued

```
    <RecipientParty>
      <InternalID schemeID="PartyID"
schemeAgencyID="BPL__300">747</InternalID>
      <ContactPerson>
        <InternalID schemeID="PartyID"
schemeAgencyID="BPL__300">737</InternalID>
        <Address>...</Address>
      </ContactPerson>
    </RecipientParty>
    ...
  </MessageHeader>
  ....
</PurchaseOrderRequest>.
```

In the above example, for SenderParty, schemeAgencyID="016" can correspond to Dun & Bradstreet according to the code list DE 3055. For RecipientParty: schemeID="PartyID" specifies that the scheme "PartyID" was used to identify the party. schemeAgencyID="BPL__300" specifies that the scheme was assigned by the SAP CMDM system "BPL__300."

The structure of GDT Business Document Message Header Party 5100 is depicted in FIG. 51. For the GDT Business Document Message Header Party 5100, the Object Class is Business Document Message Header Party 5102 and the Property is Details 5104.

InternalID 5106 refers to the proprietary identifier used when SenderParty or RecipientParty use common master data (Extended Enterprise) or when they are in alignment with regard to the semantics and use of InternalID. For the GDT Internal ID 5106, the Category is Element 5108, the Object Class is Business Document Message Header Party 5110, the Property is Internal Identification 5112, the Representation/Association is Identifier 5114, the Type is GDT 5116, the Type Name is Party Internal ID 5118, and the Cardinality is zero or one 5120.

StandardID 5122 refers to the standardized identifier for SenderParty or RecipientParty of the organization based on the code list DE 3055. For the GDT Standard ID 5122, the Category is Element 5124, the Object Class is Business Document Message Header Party 5126, the Property is Standard Identification 5128, the Representation/Association is Identifier 5130, the Type is GDT 5132, the Type Name is Party Standard ID 5134, and the Cardinality is from zero to n 5136.

ContactPerson refers to the contact person of the party. For the GDT Contact Person 5138, the Category is Element 5140, the Object Class is Business Document Message Header Party 5142, the Property is Contact Person 5144, the Representation/Association is Contact Person 5146, the Type is GDT 5148, the Type Name is Contact Person 5150, and the Cardinality is zero or one 5152.

The GDT BusinessDocumentMessageHeaderParty 5100 may be used in the BusinessDocumentMessageHeader of a BusinessDocument. This GDT is meant for defining the SenderParty or RecipientParty. The different IDs of a GDT BusinessDocumentMessageHeaderParty 5100 may identify the same party.

A party may be identified using an InternalID or Standard ID. InternalID is when SenderParty and RecipientParty use common master data or are in alignment with regard to the semantics and use of InternalID. StandardID is when SenderParty and RecipientParty can manage standardized identifiers. Of all of the IDs available to the SenderParty, generally those IDs the RecipientParty is expected to understand are used in a BusinessDocument. Either company-internal ID or a standardized ID can be used for identification.

GDT BusinessDocumentMessageHeaderParty 5100 can be used for the details and identification of the sender or recipient of a BusinessDocument. Furthermore, additional information about the contact person, including address, can be defined, which makes it possible to contact this person directly should any problems or errors occur when validating or processing the inbound BusinessDocument.

(q) BusinessDocumentMessageID

A GDT BusinessDocumentMessageID 5200 may be a unique identifier of a business document in a message that is issued by the sender business application. An example of GDT BusinessDocumentMessageID 5200 is:

```
<PurchaseOrderRequest>
    <MessageHeader>
        <ID
            schemeID="ORDER"
            schemeAgencyID="124224"
            schemeAgencySchemeAgencyID="12232344">
            00000000000001
        </ID>
        ...
    </MessageHeader>
    ....
</PurchaseOrderRequest>.
```

The structure of GDT Business Document Message ID 5200 is depicted in FIG. 52. For the GDT Business Document Message ID 5200, the Category is Complex Type 5202, the Object Class is Business Document Message 5204, the Property is Identification 5206, the Representation/Association is Identifier 5208, the Type is CCT 5210, the Type Name is Identifier 5212, the Length is from one to thirty-five 5214. The GDT Business Document Message ID 5200 may be a restricted GDT.

SchemeID 5218 identifies an identification scheme. These identification schemes may be provided by a code list, such as the SAP MessageTypes. The "schemeID" attribute is not required if the GDT BusinessDocumentMessageID 5200 is unique within a schemeAgencyID. For the GDT Scheme ID 5218, the Category is Attribute 5220, the Object Class is Identification Scheme 5222, the Property is Identification 5224, the Representation/Association is Identifier 5226, the Type is xsd 5228, the Type Name is Token 5230, the Length is from one to sixty 5232, and the Cardinality is zero or one 5234.

SchemeAgencyID 5236 may be covered by the agency ID of the sender. If this agency manages multiple business systems, the schemeAgencyID contains the unique identification of the respective business system from which the BusinessDocument was sent. For the GDT Scheme Agency ID 5236, the Category is Attribute 5238, the Object Class is Identification Scheme Agency 5240, the Property is Identification 5242, the Representation/Association is Identifier 5244, the Type is xsd 5246, the Type Name is Token 5248, and the Length is from one to sixty 5250. The Cardinality between the GDT BusinessDocumentMessageID 5200 and SchemeAgencyID is zero or one 5252.

SchemeAgencySchemeAgencyID contains the unique identification of the agency that manages the schemeAgencyID. This attribute may contain values from DE 3055 (excluding roles). This attribute is not required if this information comes unequivocally from the sender.

The format of GDT BusinessDocumentMessageID 5200 identification is a sequential number comprising a maximum of 35 characters. The number may be positive. This representation complies with the UN/EDIFACT conventions (see DE 0340 (Interactive Message Reference Number)).

The GDT BusinessDocumentMessageID 5200 is a unique identification for at least the entire lifetime of a BusinessDocument. The identification is generated by the respective business application of the creator and, in an embodiment, may not be created or interpreted by the technical message transfer systems.

The technical MessageID depends on the respective technical transfer protocol and may not be associated with the GDT BusinessDocumentMessageID 5200. When a technical message is sent, the BusinessDocument is the payload in the message. The MessageID can change as a result of the forwarding mechanisms of the respective middleware systems or the different transfer protocols used.

In the inbound direction, mapping can be performed to the in-house message code. In the outbound direction, there are various scenarios. If a Sender is known because it is given by SenderParty, schemeID 5202 identifies the message type. If a Sender is unknown because it is not given by SenderParty and Identification of business level at the sender is standardized, then schemeID 5202 identifies the message type, schemeAgencyID 5204 identifies the standardized ID for the agency that generates the MessageID, and schemeAgencySchemeAgencyID 5206 identifies the agency from DE 3055 that manages the standardized ID schemeAgencyId. If a Sender is unknown because it is not given by SenderParty and identification of business level at the sender is proprietary, then schemeID 5202 identifies the message type, schemeAgencyID 5204 identifies the proprietary ID for the agency that generates the MessageID, and schemeAgencySchemeAgencyID 5206 identifies 'ZZZ' which is mutually defined from DE 3055.

If a Sender has multiple business systems that are unique within an agency (for example: System Landscape Directory), then schemeID 5202 identifies the message type and schemeAgencyID 5204 identifies the unique ID of the business system that may be unique within an agency. In this scenario, uniqueness is ensured by the sender and the Sender is not required in internal communication.

(r) BusinessTransactionBlockedIndicator

A GDT BusinessTransactionBlockedIndicator 5300 indicates whether or not the execution of a business transaction is blocked. An example of GDT BusinessTransactionBlockedIndicator 5300 is:

<DeliveryExecutionBlockedIndicator>true</DeliveryExecutionBlockedIndicator>.

The structure of GDT Business Transaction Blocked Indicator 5300 is depicted in FIG. 53. For the GDT Business Transaction Blocked Indicator 5300, the Object Class is Business Transaction 5302, the Property is Blocked Indicator 5304, the Representation/Association is Indicator 5306, the Type is CCT 5308, and the Type Name is Indicator 5310.

GDT BusinessTransactionBlockedIndicator 5300 may have the value true or false. True indicates that the execution of a business transaction is blocked. False indicates that the execution of a business transaction is not blocked.

The GDT BusinessTransactionBlockedIndicator 5300 can be used in various environments, such as in delivery and in billing. In a delivery environment, this data type is used by a requesting application (e.g., Sales) to send a delivery request to Supply Chain Execution (e.g., for planning purposes) at an early stage, but, at the same time, to inform Supply Chain Execution that the delivery should not be executed yet since several points still have to be clarified with the customer, necessary papers are missing, or the customer's credit limit has been exceeded or has not yet been checked.

In a billing environment, this data type is used by a requesting application (e.g., Sales) to set up a billing due list in billing but, at the same time, to specify that billing may not yet be executed. It is possible that the requesting application first executes a release procedure, that the customer-specific prices have not yet been determined, that certain necessary documents have not yet been received (letter of credit procedure), or that the customer's credit limit has been exceeded.

(s) CompletedIndicator

A GDT CompletedIndicator 5400 depicted in FIG. 54 indicates whether an object is completed in a business sense or not. GDT CompletedIndicator 5400 may relate to business translations (for example, invoice creation, delivery, sourcing) or to objects that have the character of a transaction (for example, product catalog transfer in multiple steps). An example of GDT CompletedIndicator 5400 is: <CompletedIndicator>false</CompletedIndicator>.

The structure of GDT CompletedIndicator 5400 is depicted in FIG. 54. For GDT CompletedIndicator 5400, the Property is Completed Indicator 5402, the Representation/Association is Indicator 5404, the Type is CCT 5406, and the Type Name is Indicator 5408.

The GDT CompletedIndicator 5400 can have the values true or false. True indicates that an object is completed. False indicates that an object is not completed.

The GDT CompletedIndicator 5400 is used to indicate that the processing of an object has been completed, even if further processing steps are being run in a different context (for example, sourcing for a requirement may be completed but procurement of the requirement calls for further process steps). In various embodiments, for various objects a CompletedIndicator or a CancelledIndicator can be used depending on whether it is desired to emphasize that processing of the object has been completed properly (CompletedIndicator) or that the object has been canceled in the sense of an exception situation (CancelledIndicator).

From the context of the interface in which a GDT CompletedIndicator 5400 is used, the object to which the CompletedIndicator refers is described, its business significance is described, and whether a set CompletedIndicator can be undone in a follow-on message is described.

(t) BusinessTransactionDocumentGroupID

A GDT BusinessTransactionDocumentGroupID 5500 may uniquely identify a group of business documents that are to be considered as one group within a business process. An example of GDT BusinessTransactionDocumentGroupID 5500 is: <DeliveryGroupID>4711</DeliveryGroupID>.

The structure of GDT Business Transaction Document Group ID 5500 is depicted in FIG. 55. For the GDT Business Transaction Document Group ID 5500, the Object Class is Business Transaction Document 5502, the Property is Group Identification 5504, the Representation/Association is Indicator 5506, the Type is CCT 5508, the Type Name is Identifier 5510, the Length is from one to ten 5512. The GDT Business Transaction Document Group ID 5500 may be a restricted GDT.

GDT BusinessTransactionDocumentGroupID 5500 is used to identify documents that belong together to enable them to be processed together by the application. "BusinessTransactionDocument" is replaced by the description of each document in the XML instance, e.g., "PurchaseOrder" for a purchase order, "Delivery" for a delivery, and the like.

(u) BusinessTransactionDocumentID

A GDT BusinessTransactionDocumentID 5600 is a unique identifier for a document in a business transaction. An example for GDT BusinessTransactionDocumentID 5600 is: <OrderID schemeID='Orders' schemeAgencyID='123456789'schemeAgencySchemeAgencyID='16'>5400000012</OrderID> which assigns the identifier 5400000012 to the OrderID having an "Orders" identification scheme, "123456789" as the agency managing the identification scheme, and 16 as the identification scheme that represents the context that is used to identify the agency.

The structure of GDT Business Transaction Document ID 5600 is depicted in FIG. 56. For the GDT Business Transaction Document ID 5600, the Object Class is Business Transaction Document 5602, the Property is Identification 5604, the Representation/Association is Identifier 5606, the Type is CCT 5608, the Type Name is Identifier 5610, and the Length is from one to thirty-five 5612. The GDT Business Transaction Document ID 5600 may be a restricted GDT.

For the GDT Scheme ID 5616, the Category is Attribute 5618, the Object Class is Identification Scheme 5620, the Property is Identification 5622, the Representation/Association is Identifier 5624, the Type is xsd 5626, the Type Name is Token 5628, and the Length is from one to sixty 5630. The Cardinality is zero or one 5632.

For the GDT Scheme Agency ID 5634, the Category is Attribute 5636, the Object Class is Identification Scheme Agency 5638, the Property is Identification 5640, the Representation/Association is Identifier 5642, the Type is xsd 5644, the Type Name is Token 5646, the Length is from one to sixty 5648, and the Cardinality is zero or one 5650.

For the GDT Scheme ID 5616, the Category is Attribute 5618, the Object Class is Identification Scheme 5620, the Property is Identification 5622, the Representation/Association is Identifier 5624, the Type is xsd 5626, the Type Name is Token 5628, and the Length is from one to sixty 5630. The Cardinality is zero or one 5632.

For the GDT Scheme Agency Scheme ID 5652, the Category is Attribute 5654, the Object Class is Identification Scheme Agency 5656, the Property is Scheme 5658, the Representation/Association is Identifier 5660, the Type is xsd 5662, the Type Name is Token 5664, and the Length is from one to sixty 5666. The Cardinality is zero or one 5668.

For the GDT Scheme Agency ID 5670, the Category is Attribute 5672, the Object Class is Identification Scheme Agency 5674, the Property is Scheme Agency 5676, the Representation/Association is Identifier 5678, the Type is xsd 5680, the Type Name is Token 5682, and the Length is three 5684. The Cardinality is zero or one 5686.

A business process uses GDT BusinessTransactionDocumentID 5600 to uniquely identify a document, such as a purchase order or an invoice in a business transaction. A partner uses a GDT BusinessTransactionDocumentID 5600 to inform another partner of the identification of a business transaction document in an initial step, e.g., when creating data for the business transaction or sending it for the first time. The second partner can use this identifier to reference the business transaction document in the subsequent process.

In an embodiment, there may be no standardized IDs for transaction data. The attributes schemeID, schemeAgencyID, schemeAgencySchemeID, and schemeAgencySchemeAgencyID are used in the same way as for the CCT Identifier to define the context for which a GDT BusinessTransactionDocumentID 5600 is guaranteed to be unique.

In the XML instance, "BusinessTransactionDocument" is replaced by the description of the respective document, e.g., "PurchaseOrder" for a purchase order, "Delivery" for a delivery, and the like.

(v) BusinessTransactionDocumentItemGroupID

A GDT BusinessTransactionDocumentationGroupID 5700 uniquely identifies a group of business document items that are to be characterized as a group within a business document. An example of GDT BusinessTransactionDocumentationGroupID 5700 is:

<DeliveryItemGroupID>123</DeliveryItemGroupID>.

The structure of GDT Business Transaction Document Item Group ID 5700 is depicted in FIG. 57. For the GDT Business Transaction Document Item Group ID 5700, the Object Class is Business Transaction Document Item 5702, the Property is Group Identification 5704, the Representation/Association is Identifier 5706, the Type is CCT 5708, the Type Name is Identifier 5710, and the Length is three 5712. The GDT Business Transaction Document Item Group ID 5700 may be restricted.

A freely-definable numeric sequence may be used for display purposes. In an embodiment, it is a 3-digit, numeric text field. Leading zeros are also displayed. However, according to the current definition in R/3 in the processing applications "order" and "delivery," a 3-figure, numeric text field (NUMC3) having a freely-definable 3-character string using the character set {"0," "1," "2," "3," "4," "5," "6," "7," "8," "9"} may be used. Otherwise, a corresponding mapping may be necessary, but it might not be unique due to the use of a larger number of characters. In this case, the uniqueness may have to be ensured explicitly. This requirement, however, may not be ensured explicitly per definition/data type and therefore may be documented.

The GDT BusinessTransactionDocumentationGroupID 5700 is used to indicate the items of a business document that belong together for a unique identification of this item grouping in subsequent steps. For example, delivery groups are used to check the availability of materials that may be delivered together. Items that belong to the same delivery group may be delivered at the same time. Therefore, from the point of view of the availability check, the products/materials selected in the highlighted items may be available in sufficient quantities at the same time on the requested date so that the requirement can be fulfilled.

In the XML instance, the "BusinessTransactionDocument" is replaced by the description of the respective document, e.g., "PurchaseOrder" for a purchase order, "Delivery" for a delivery, and the like.

(w) BusinessTransactionDocumentItemHierarchyRelationshipTypeCode

A CDT BusinessTransactionDocumentItemHierarchyRelationshipTypeCode 5800 is a coded representation of the business type of a hierarchical relationship between items of a BusinessTransactionDocument. An example of CDT BusinessTransactionDocumentItemHierarchyRelationshipTypeCode 5800 in the context of a purchase order item is:

<HierarchyRelationshipTypeCode>001</HierarchyRelationshipTypeCode>.

The structure of CDT Business Transaction Document Item Hierarchy Relationship Type Code 5800 is depicted in FIG. 58. For the CDT Business Transaction Document Item Hierarchy Relationship Type Code 5800, the Object Class Qualification is Business Transaction Document Item Hierarchy 5802, the Object Class is Relationship 5804, the Property is Type Code 5806, the Representation/Association is Code 5808, the Type is GDT 5810, the Type is Relationship Type Code 5812, and the Length is three 5814. The CDT Business Transaction Document Item Hierarchy Relationship Type Code 5800 may be restricted.

The GDT BusinessTransactionDocumentItemHierarchyRelationshipTypeCode 5800 is based on the GDT ObjectStructureRelationshipTypeCode. Elements of type BusinessTransactionDocumentItemHierarchyTypeCode can have values 001, 002, 003, or 006. 001 means that the relationship is a bill of material relationship, 002 means the relationship is a grouping relationship (one object in this relationship is part of a logical grouping to another object), 003 means the relationship is a discount in kind relationship, and 006 means the relationship is a substitution product relationship.

The CDT BusinessTransactionDocumentItemHierarchyRelationshipTypeCode 5800 is used together with a ParentItemID to map item hierarchies. An item hierarchy is a tree of subordinated items, where the BusinessTransactionDocumentHierarchyRelationshipTypeCode 5800 describes the meaning of the hierarchical level of an item.

When using the CDT BusinessTransactionDocumentItemHierarchyRelationshipTypeCode 5800, which types of lower-level items are permitted in each use context and which integrity conditions apply to items in a hierarchy of a particular CDT BusinessTransactionDocumentItemHierarchyRelationshipTypeCode 5800 may be explicitly defined. In particular, it may be specified how hierarchies with different BusinessTransactionDocumentItemHierarchyRelationshipTypeCodes can be combined with each other. For example: When a bill of material hierarchy and a grouping hierarchy exist for one item, and when a grouping hierarchy exists for an item.

In an embodiment, there may be one hierarchy for each item, that is, the same CDT BusinessTransactionDocumentItemHierarchyRelationshipTypeCode 5800 is specified for lower-level items. However, there are exceptions to this rule. A purchase order can contain items that have both a bill of material hierarchy and a discount in kind hierarchy. In an embodiment, the CDT BusinessTransactionDocumentItemHierarchyRelationshipTypeCode 5800 may be a proprietary code list with fixed predefined values. In that case, changes to the permitted values may involve changes to the interface.

In the XML instance, "BusinessTransactionDocument" is replaced by the description of the specific business transaction document, for example "PurchaseOrder" for a purchase order, "Delivery" for a delivery, and the like.

(x) BusinessTransactionDocumentItemID

A GDT BusinessTransactionDocumentItemID 5900 is a unique identifier of an item or sub item of a document within a business transaction and is unique in the context of the business transaction. An example of BusinessTransactionDocumentItemID is: <ItemID>13</ItemID>.

The structure of GDT Business Transaction Document Item ID 5900 is depicted in FIG. 59. For the GDT Business Transaction Document Item ID 5900, the Object Class is Business Transaction Document Item 5902, the Property is Identification 5904, the Representation/Association is Identifier 5906, the Type is CCT 5908, the Type Name is Identifier 5910, and the Length is from one to ten 5912. The GDT Business Transaction Document Item ID 5900 may be restricted 5914.

GDT BusinessTransactionDocumentItemID 5900 is a sequence of numbers with a maximum of ten characters. Leading zeros may not be significant at the recipient and may not be sent.

Business transactions, such as purchase orders or invoices, may be divided into items and sub items. GDT BusinessTransactionDocumentItemID 5900 is used in a business process to identify uniquely an item or sub item within a business transaction. A partner uses its GDT BusinessTransactionDocumentItemID 5900 to inform the other partner of its identification of the item in an initial step, for example, when creating an item or transmitting it for the first time. The second partner can then use this identifier to reference the respective item of the document in the subsequent process.

In the XML instance, "BusinessTransactionDocument" is replaced by the description of the respective document, e.g., "PurchaseOrder" for a purchase order, "Delivery" for a delivery, and the like.

(y) BusinessTransactionDocumentItemScheduleLineID

A GDT BusinessTransactionDocumentItemScheduleLineID 6000 is a unique identifier that uses a deadline to identify the schedule line of a document item within a business transaction. An example of GDT BusinessTransactionDocumentItemScheduleLineID 6000 is: <PurchaseOrderItemScheduleLineID>0001</PurchaseOrderItemScheduleLineID>.

The structure of GDT Business Transaction Document Item Schedule Line ID 6000 is depicted in FIG. 60. For the GDT Business Transaction Document Item Schedule Line ID 6000, the Object Class is Business Transaction Document Item Schedule Line 6002, the Property is Identification 6004, the Representation/Association is Identifier 6006, the Type is CCT 6008, the Type Name is Identifier 6010, the Length is from one to four 6012. The GDT Business Transaction Document Item Schedule Line ID 6000 may be restricted 6014.

Documents such as purchase orders, sales orders, or invoices are divided into items. Items are then further divided according to schedule lines. Each of these schedule lines specifies a deadline and relevant product quantities for this deadline.

"BusinessTransactionDocument" is replaced by the description of each document in the XML instance, e.g., "PurchaseOrder" for a purchase order, "Delivery" for a delivery, and the like.

(z) ThirdPartyIndicator

A GDT ThirdPartyIndicator 6100 indicates whether or not a document item is used in the context of a third-party deal. An example of GDT ThirdPartyIndicator 6100 in the context of a document item is: <ThirdPartyDealIndicator>true</ThirdPartyDealIndicator>.

The structure of GDT Third Party Indicator 6100 is depicted in FIG. 61. For the GDT Third Party Indicator 6100, the Object Class is Business Transaction Document Item 6102, the Property is third Party Deal Indicator 6104, the Representation/Association term is Indicator 6106, the Type is CCT 6108, and the Type Name is Identifier 6110. The GDT ThirdPartyIndicator 6100 can have the values true or false. True indicates that the object is used in the context of a third-party deal. False indicates that the object is not used in the context of a third-party deal.

The GDT ThirdPartyIndicator 6100 is used to indicate that a document item is used in the context of a third-party deal. A third-party deal may be a process in which a company processes a sales order via a third party rather than fulfilling it directly itself. The context to which the BusinessTransactionDocumentItemThirdPartyDealIndicator refers may be clear from the usage of the GDT.

(aa) BusinessTransactionDocumentItemTypeCode

The GDT BusinessTransactionDocumentItemTypeCode 6200 is a coded representation of the type of an item in a document that occurs in business transactions. The document item type describes the business nature of similar document items and defines the basic features of the document items of this type. An example of GDT BusinessTransactionDocumentItemTypeCode 6200 is: <BusinessTransactionDocumentItemTypeCode>001</BusinessTransactionDocumentItemTypeCode>.

The structure of GDT Business Transaction Document Item Type Code 6200 is depicted in FIG. 62. For the GDT Business Transaction Document Item Type Code 6200, the Object Class is Business Transaction Document Item 6202, the Property is Type 6204, the Representation/Association is Code 6206, the Type is CCT 6208, the Type Name is Code 6210, and the Length is three 6212. The GDT Business Transaction Document Item Type Code 6200 may be restricted 6214.

GDT BusinessTransactionDocumentItemTypeCode 6200 can have a value from 001 to 004. 001 identifies a purchase order item that specifies an ordered product or additional information on ordered products. This includes information on free goods, substitute products and value limits. 002 identifies an invoice item that specifies prices and taxes for a delivered product (including completed work) and, if necessary, more information on this product. 003 identifies a credit memo item that specifies refunded prices and taxes for a delivered product (including completed work) and, if necessary, more information on this product. 004 identifies a delivery cost item that specifies delivery costs incurred by the purchaser on top of the actual product costs. There may be a differentiation between shipping costs, customs duty costs, and miscellaneous costs, such as packaging and insurance.

Certain combinations of a GDT BusinessTransactionDocumentItemTypeCode 6200 and a BusinessTransactionDocumentTypeCode may be allowed. For example, if BusinessTransactionDocurnentTypeCode is 001, BusinessTransactionDocumentItemTypeCode may be 001. If BusinessTransactionDocumentTypeCode is 004, BusinessTransactionDocumentItemTypeCode may be 002, 003, or 004. If BusinessTransactionDocumentTypeCod is 005, BusinessTransactionDocumentItemTypeCode may be 001.

The GDT BusinessTransactionDocumentItemTypeCode 6200 categorizes an item in a document that is sent if the concrete semantic meaning of the item or sub-item is not defined by the message itself or if semantically different items can occur in one message. In particular, there are documents in applications that contain items with different types so that it may not be enough to specify the type of the complete document. For example, in addition to a "standard" invoice item for an ordered product, an invoice can contain a delivery costs item that is to be shown separately.

In an example, in R/3, the BusinessTransactionDocumentItemTypeCode 6200 corresponds to VBTYP+POSAR in Sales or BSTYP in Purchasing or MRM_REFERENZBELEG in Invoice Verification, and the like, at a less detailed level.

(bb) BusinessTransactionDocumentLocation

A CDT BusinessTransactionDocumentLocation 6300 contains the information that is exchanged in business documents about a location relevant for business transactions. This information identifies the location and its address. The identification may be a company-internal ID, a standardized ID, or one or several partner-specific IDs. A location is a logical or a physical place. An ID for a location assigned by a party identifies in the name the role the assigning party plays in the business transaction. At present, the role descriptions are Buyer, Seller, ProductRecipient, Vendor, BillTo, and BillFrom. An example of CDT BusinessTransactionDocumentLocation 6300 is:

```
<InventoryChange>
    ...
    <Location>
        <StandardID schemeAgencyID="016">4711</StandardID>
        <BuyerID>9873</BuyerID>
        <Address>...</Address>
    <Location>
<InventoryChange>.
```

The structure of CDT Business Transaction Document Location 6300 is depicted in FIG. 63. For the CDT Business Transaction Document Location 6300, the Object Class is Business Transaction Document Location 6302 and the Representation/Association is Details 6304.

For the Internal ID 6306, the Category is Element 6308, the Object Class is Business Transaction Document Location 6310, the Property Qualifier is Internal 6312, the Property is Identification 6314, the Representation/Association is Identifier 6316, the Type is CDT 6318, and the Type Name is Location Internal ID 6320. The Cardinality is zero or one 6322.

For the Standard ID 6324, the Category is Element 6326, the Object Class is Business Transaction Document Location 6328, the Property Qualifier is Standard 6330, the Property is Identification 6332, the Representation/Association is Identifier 6334, the Type is CDT 6336, and the Type Name is Location Standard ID 6338. The Cardinality is from zero to n. 6340.

For the Buyer ID 6342, the Category is Element 6344, the Object Class is Business Transaction Document Location 6346, the Property Qualifier is Buyer 6363, the Property is Identification 6350, the Representation/Association is Identifier 6352, the Type is CDT 6354, and the Type Name is Location Party ID 6356. The Cardinality is zero or one 6358.

For the Seller ID 6360, the Category is Element 6362, the Object Class is Business Transaction Document Location 6364, the Property Qualifier is Seller 6366, the Property is Identification 6368, the Representation/Association is Identifier 6370, the Type is CDT 6372, and the Type Name is Location Party ID 6374. The Cardinality is zero or one 6376.

For the Seller ID 6360, the Category is Element 6362, the Object Class is Business Transaction Document Location 6364, the Property Qualifier is Seller 6366, the Property is Identification 6368, the Representation/Association is Identifier 6370, the Type is CDT 6372, and the Type Name is Location Party ID 6374. The Cardinality is zero or one 6376.

For the Product Recipient ID 6378, the Category is Element 6380, the Object Class is Business Transaction Document Location 6390, the Property Qualifier is Product Recipient 6392, the Property is Identification 6394, the Representation/Association is Identifier 6396, the Type is CDT 6398, and the Type Name is Location Party ID 6399. The Cardinality is zero or one 6301A.

For the Vendor ID 6302A, the Category is Element 6303A, the Object Class is Business Transaction Document Location 6304A, the Property Qualifier is Vendor 6305A, the Property is Identification 6306A, the Representation/Association is Identifier 6307A, the Type is CDT 6308A, and the Type Name is Location Party ID 6309A. The Cardinality is zero or one 6310A.

For the Bill To ID 6311A, the Category is Element 6312A, the Object Class is Business Transaction Document Location 6313A, the Property Qualifier is Bill To 6314A, the Property is Identification 6315A, the Representation/Association is Identifier 6316A, the Type is CDT 6317A, and the Type Name is Location Party ID 6318A. The Cardinality is zero or one 6319A.

For the Bill From ID 6320A, the Category is Element 6321A, the Object Class is Business Transaction Document Location 6322A, the Property Qualifier is Bill From 6323A, the Property is Identification 6324A, the Representation/Association is Identifier 6325A, the Type is CDT 6326A, and the Type Name is Location Party ID 6327A. The Cardinality is zero or one 6328A.

For the Bidder ID 6329A, the Category is Element 6330A, the Object Class is Business Transaction Document Location 633 1A, the Property Qualifier is Bidder 6332A, the Property is Identification 6333A, the Representation/Association is Identifier 6334A, the Type is CDT 6335A, and the Type Name is Location Party ID 6336A. The Cardinality is zero or one 6337A.

For the Address 6338A, the Category is Element 6339A, the Object Class is Business Transaction Document Location 6340A, the Property is Address 6341A, the Representation/Association is Address 6342A, the Type is GDT 6343A, and the Type Name is Address 6344A. The Cardinality is zero or one 6345A.

For the Note 6346A, the Category is Element 6347A, the Object Class is Business Transaction Document Location 6348A, the Property is Note 6349A, the Representation/Association is Text 6350A, the Type is GDT 6351A, and the Type Name is Note 6352A. The Cardinality is zero or one 6353A.

InternalID refers to a proprietary identifier that is used when both sender and recipient can access shared master data (extended enterprise). Standard ID refers to a standardized identifier, whose identification schemes may be managed by an agency from the DE 3055 code list. Buyer ID refers to an identifier that is used by the BuyerParty proprietarily for this location. SellerID refers to an identifier that is used by the SellerParty proprietarily for this location. ProductRecipientID refers to an identifier that is used by the ProductRecipientParty proprietarily for this location. VendorID refers to an identifier that is used by the VendorParty proprietarily for this location. BillToID refers to an identifier that is used by the BillToParty proprietarily for this location. BillFromID refers to an identifier that is used by the BillFromParty proprietarily for this location. BidderID refers to an identifier that is used by the BidderParty proprietarily for this location. Address is an address that describes the location by specifying information such as postal address, geographic coordinates, or any other information that specifies a location. Note refers to an additional information such as direction.

When defining addresses, organization addresses may be supported. The different IDs of a CDT BusinessTransactionDocumentLocation 6300 identify the same location. A location may be identified by the InternalID when sender and recipient can access shared master data, by the StandardID when sender and recipient can manage standardized identifiers, or by the PartyIDs: when sender and recipient are interested in the PartyIDs assigned by the parties involved. From all of the IDs available to the sender, the IDs that the recipient is expected to understand may be used.

(cc) BusinessTransactionDocumentParty

A CDT BusinessTransactionDocumentParty 6400 contains the information that is exchanged—in accordance with common business understanding—in business documents about a party involved in business transactions. This information is used to identify the party and the party's address, as well as the party's contact person and the contact person's address. This identification can take place using an internal ID, a standardized ID, or IDs assigned by the parties involved. A party is a natural person, organization, or business partner group in which a company has a business or intra-enterprise interest. This could be a person, organization, or group within or outside of the company. An ID assigned by a party identifies in the name the role the assigning party plays in the business transaction. At present, the roles are Buyer, Seller, ProductRecipient, Vendor, BillTo, BillFrom and Bidder. An example of CDT BusinessTransactionDocumentParty 6400 is:

```
<PurchaseOrder>
    ...
    <BuyerParty>
        <StandardID schemeAgencyID="016">4711</StandardID>
        <BuyerID>9873</BuyerID>
        <SellerID>487847</SellerID>
        <Address>...</Address>
        <ContactPerson>
            <BuyerID>9874</BuyerID>
            <SellerID>487848</SellerID>
            <Address>...</Address>
        </ContactPerson>
    </BuyerParty>
</PurchaseOrder>.
```

In this example, schemeAgencyID="016" corresponds to Dun&Bradstreet according to code list D3055 that means that the DUNS number is assigned by Dun&Bradstreet. The following is a second example of BusinessTransactionDocumentParty:

```
<PurchaseOrder>
    ...
    <BuyerParty>
        <InternalID schemeID="PartyID"
schemeAgencyID="BPL_300">747</InternalID>
        <Address>...</Address>
        <ContactPerson>
            <InternalID schemeID="PartyID"
schemeAgencyID="BPL_300">737</InternalID>
            <Address>...</Address>
        </ContactPerson>
    </BuyerParty>
<PurchaseOrder>.
```

In this example, schemeID="PartyID" indicates that the scheme "PartyID" was used to identify the party and schemeAgencyID="BPL__300" indicates that the scheme was assigned by the SAP CMDM system "BPL__300."

The examples above show the XML instance of the GDT BusinessTransactionDocumentParty within a purchase order for different identification types (standard ID, party IDs, internal ID). In this scenario, the party assumes the role of Buyer.

The structure of CDT Business Transaction Document Party 6400 is depicted in FIG. 64. For the CDT Business Transaction Document Party 6400, the Category is Element 6408, the Object Class is Business Transaction Document Party 6402, and the Representation/Association is Details 6404.

For the Internal ID 6406, the Category is Element 6408, the Object Class is Business Transaction Document Party 6470, the Property Qualifier is Internal 6412, the Property is Identification 6414, the Representation/Association is Identifier 6416, the Type is CDT 6418, and the Type Name is Party Internal ID 6420. The Cardinality is zero or one 6422.

For the Standard ID 6424, the Category is Element 6426, the Object Class is Business Transaction Document Party 6428, the Property Qualifier is Standard 6430, the Property is Identification 6432, the Representation/Association is Identifier 6434, the Type is CDT 6436, and the Type Name is Party Standard ID 6438. The Cardinality is from zero to n. 6440.

For the Buyer ID 6442, the Category is Element 6444, the Object Class is Business Transaction Document Party 6446, the Property Qualifier is Buyer 6448, the Property is Identification 6450, the Representation/Association is Identifier 6452, the Type is CDT 6454, and the Type Name is Party ID 6456. The Cardinality is zero or one 6458.

For the Seller ID 6460, the Category is Element 6462, the Object Class is Business Transaction Document Party 6464, the Property Qualifier is Seller 6466, the Property is Identification 6468, the Representation/Association is Identifier 6470, the Type is CDT 6472, and the Type Name is Party Party ID 6474. The Cardinality is zero or one 6476.

For the Product Recipient ID 6478, the Category is Element 6480, the Object Class is Business Transaction Document Party 6482, the Property Qualifier is Product Recipient 6484, the Property is Identification 6486, the Representation/Association is Identifier 6488, the Type is CDT 6490, and the Type Name is Party Party ID 6492. The Cardinality is zero or one 6494.

For the Vendor ID 6496, the Category is Element 6498, the Object Class is Business Transaction Document Party 6499, the Property Qualifier is Vendor 6401A, the Property is Identification 6402A, the Representation/Association is Identifier 6403A, the Type is CDT 6404A, and the Type Name is Party Party ID 6405A. The Cardinality is zero or one 6406A.

For the Bill To ID 6407A, the Category is Element 6408A, the Object Class is Business Transaction Document Party 6409A, the Property Qualifier is Bill To 6410A, the Property is Identification 6411A, the Representation/Association is Identifier 6412A, the Type is CDT 6413A, and the Type Name is Party Party ID 6414A. The Cardinality is zero or one 6415A.

For the Bill From ID 6416A, the Category is Element 6417A, the Object Class is Business Transaction Document Party 6418A, the Property Qualifier is Bill From 6419A, the Property is Identification 6420A, the Representation/Association is Identifier 6421A, the Type is CDT 6422A, and the Type Name is Party Party ID 6423A. The Cardinality is zero or one 6424A.

For the Bidder ID 6425A, the Category is Element 6426A, the Object Class is Business Transaction Document Party 6427A, the Property Qualifier is Bidder 6428A, the Property is Identification 6429A, the Representation/Association is Identifier 6430A, the Type is CDT 6431A, and the Type Name is Party Party ID 6432A. The Cardinality is zero or one 6433A.

For the Address 6434A, the Category is Element 6435A, the Object Class is Business Transaction Document Party 6436A, the Property is Address 6437A, the Representation/Association is Address 6438A, the Type is GDT 6440A, and the Type Name is Address 6441A. The Cardinality is zero or one 6424A.

For the Contact Person 6443A, the Category is Element 6444A, the Object Class is Business Transaction Document Party 6445A, the Property is Contact Person 6446A, the Representation/Association is Contact Person 6447A, the Type is CDT 6448A, and the Type Name is Contact Person 6464A. The Cardinality is zero or one 6450A.

InternalID refers to a proprietary identifier that is used when both sender and recipient can access shared master data (extended enterprise). StandardID refers to a standardized identifier for this party, whose identification scheme may be managed by an agency from the DE 3055 code list. BuyerID refers to an identifier that is used by the BuyerParty for this party. SellerID refers to an identifier that is used by the SellerParty for this party. ProductRecipientID refers to an identifier that is used by the ProductRecipientParty for this party. VendorID refers to an identifier that is used by the VendorParty for this party. BillToID refers to an identifier that is used by the BillToParty for this party. BillFromID referes to an identifier that is used by the BillFromParty for this party. BidderID refers to an identifier that is used by the BidderParty for this party. Address refers to the address of the party. ContactPerson refers to a contact person of the party.

The different IDs of a CDT BusinessTransactionDocumentParty 6400 may identify the same party. A party may be identified by InternalID when sender and recipient can access shared master data, by StandardID when sender and recipient can manage standardized identifiers, or by PartytPartyIDs when sender and recipient are interested in the PartyIDs assigned by the parties involved. Of the IDs available to the sender, IDs that the recipient is expected to understand may be used in a message.

The parties involved in a business transaction assume a specific role that is also specified for them in the corresponding business documents. For example, BuyerParty is a party that buys goods or services, SellerParty is a party that sells goods or services, CreditorParty is a party that is authorized to claim goods, services or payment for a debt owed to it, DebtorParty is a party that is obliged to provide goods, services or payment for a debt it owes, ProductRecipientParty is a party to which goods are delivered or for which services are provided, VendorParty is a party that delivers goods or provides services, ManufacturerParty is a party that manufactures goods, PayerParty is a party that pays for goods or services, PayeeParty is a party that receives a payment for goods or services, BillToParty is a party to which the invoice for goods or services is sent, BillFromParty is a party that creates the invoice for goods or services, CarrierParty is a party that transports goods, RequestorParty is a party that requests the procurement of goods or services, PortalProviderParty is a party that runs a portal that brings business partners together for a business transaction, CatalogueProviderParty is a party that compiles a catalogue, BidderParty is a party that bids for goods or services, and OwnerParty is a party that has tangible or intangible assets as property.

The CDT BusinessTransactionDocumentParty 6400 is used in messages for internal and external communication to transmit required information about the parties involved.

(dd) BusinessTransactionDocumentPricingIndicator

The GDT BusinessTransactionDocumentPricingIndicator 6500 indicates whether pricing/price determination should be performed for all items or for selected items in a business transaction. An example of GDT BusinessTransactionDocumentPricingIndicator 6500 is:

<BusinessTransactionDocumentPricingIndicator>true</BusinessTransactionDocumentPricingIndicator>.

The structure of GDT Business Transaction Document Pricing Indicator 6500 is depicted in FIG. 65: For the GDT Business Transaction Document Pricing Indicator 6500, the Object Class is Business Transaction Document 6502, the Property is Pricing Indicator 6504, the Representation/Association is Indicator 6506, the Type is CCT 6508, and the Type Name is Indicator 6510.

The GDT BusinessTransactionDocumentPricingIndicator 6500 can have the values true or false. True indicates that the pricing/price determination should be performed. False indicates that the pricing/price determination should not be performed.

Business documents or items in business documents for which pricing/price determination can be performed are linked to the purchase or sale of products. Illustrative examples are order, delivery and transport documents and their items.

(ee) BusinessTransactionDocumentProduct

A CDT BusinessTransactionDocumentProduct 6600 contains the information that is exchanged—for example, in accordance with common business understanding—in business documents about a product. This information identifies the product and product type, and describes the product. This identification can occur using an internal ID, a standardized ID, or IDs assigned by the parties involved. A product is either a tangible or intangible good, and is a part of the business activities of a company. It can be traded and contributes directly or indirectly to value added. An ID assigned by a party identifies in the name the role the assigning party plays in the business transaction. At present, the roles are Buyer, Seller, ProductRecipient, Vendor, Manufacturer, BillTo, BillFrom and Bidder. An example of CDT BusinessTransactionDocumentProduct 6600 is:

EXAMPLE 1)

Standard ID, PartyIDs

```
<PurchaseOrder>
    ...
    <Product>
        <StandardID schemeAgencyID="009">4711</StandardID>
        <BuyerID>A6B7915634654</BuyerID>
        <SellerID>234532358B4</SellerID>
        <ManufacturerID>6546</ManufacturerID>
        <TypeCode>1</TypeCode>
        <Note>SAP NetWeaver</Note>
    </Product>
</PurchaseOrder>.
```

In this example, schemeAgencyID="009" corresponds to "EAN" according to code list DE 3055, and TypeCode="1" indicates it is the product type "Material."

The following is a second example of CDT BusinessTransactionDocumentProduct 6600:

EXAMPLE 2)

Internal ID

```
<PurchaseOrder>
    ...
    <Product>
        <InternalID schemeID="ProductGUID" schemeAgencyID=
"MPL_002">1C743CEC501F6A4D8826C7EC5A8554B9</InternalID>
        <TypeCode>1</TypeCode>
        <Note>SAP NetWeaver</Note>
    </Product>
</PurchaseOrder>.
```

In this example, schemeID="PartyGUID" indicates that the scheme "ProductGUID" was used to identify the product and schemeAgencyID="MPL__002" indicates that the scheme was assigned by the business system "MPL__002."

The structure of CDT Business Transaction Document Product 6600 is depicted in FIG. 66. For the CDT Business Transaction Document Product 6600, the Object Class is Business Transaction Document Product 6602, and the Representation/Association is Details 6604.

For the Internal ID 6606, the Category is Element 6608, the Object Class is Business Transaction Document Product 6610, the Property Qualifier is Internal 6612, the Property is Identification 6614, the Representation/Association is Identifier 6616, the Type is CDT 6618, and the Type Name is Product Internal ID 6620. The Cardinality is zero or one 6622.

For the Standard ID 6624, the Category is Element 6626, the Object Class is Business Transaction Document Product 6628, the Property Qualifier is Standard 6630, the Property is Identification 6632, the Representation/Association is Identifier 6634, the Type is CDT 6636, and the Type Name is Product Standard ID 6638. The Cardinality is from zero to n. 6640.

For the Buyer ID 6642, the Category is Element 6644, the Object Class is Business Transaction Document Product 6646, the Property Qualifier is Buyer 6648, the Property is Identification 6650, the Representation/Association is Identifier 6652, the Type is CDT 6654, and the Type Name is Product Party ID 6656. The Cardinality is zero or one 6658.

For the Seller ID 6660, the Category is Element 6680, the Object Class is Business Transaction Document Product 6664, the Property Qualifier is Seller 6666, the Property is Identification 6668, the Representation/Association is Identifier 6670, the Type is CDT 6672, and the Type Name is Product Party ID 6674. The Cardinality is zero or one 6676.

For the Product Recipient ID 6678, the Category is Element 6680, the Object Class is Business Transaction Document Product 6682, the Property Qualifier is Product Recipient 6684, the Property is Identification 6686, the Representation/Association is Identifier 6688, the Type is CDT 6690, and the Type Name is Product Party ID 6692. The Cardinality is zero or one 6694.

For the Vendor ID 6696, the Category is Element 6698, the Object Class is Business Transaction Document Product 6699, the Property Qualifier is Vendor 6601A, the Property is Identification 6602A, the Representation/Association is Identifier 6603A, the Type is CDT 6604A, and the Type Name is Product Party ID 6605A. The Cardinality is zero or one 6606A.

For the Manufacturer ID 6607A, the Category is Element 6608A, the Object Class is Business Transaction Document Product 6609A, the Property Qualifier is Manufacturer 6610A, the Property is Identification 6611A, the Representation/Association is Identifier 6612A, the Type is CDT 6613A, and the Type Name is Product Party ID 6614A. The Cardinality is zero or one 6615A.

For the Bill To ID 6616A, the Category is Element 6617A, the Object Class is Business Transaction Document Product 6618A, the Property Qualifier is Bill To 6619A, the Property is Identification 6620A, the Representation/Association is Identifier 6621A, the Type is CDT 6622A, and the Type Name is Product Party ID 6623A. The Cardinality is zero or one 6624A.

For the Bill From ID 6625A, the Category is Element 6626A, the Object Class is Business Transaction Document Product 6627A, the Property Qualifier is Bill From 6628A, the Property is Identification 6629A, the Representation/Association is Identifier 6630A, the Type is CDT 6631A, and the Type Name is Product Party ID 6632A. The Cardinality is zero or one 6633A.

For the Bidder ID 6634A, the Category is Element 6635A, the Object Class is Business Transaction Document Product 6636A, the Property Qualifier is Bidder 6637A, the Property is Identification 6639A, the Representation/Association is Identifier 6639A, the Type is CDT 6640A, and the Type Name is Product Party ID 6641A. The Cardinality is zero or one 6642A.

For the Type Code 6643A, the Category is Element 6644A, the Object Class is Business Transaction Document Product 6645A, the Property is Type Name Code 6646A, the Representation/Association is Code 6647A, the Type is GDT 6648A, and the Type Name is Product Type Code 6649A. The Cardinality is zero or one 6650A.

For the Note 6651A, the Category is Element 6652A, the Object Class is Business Transaction Document Product 6653A, the Property is Note 6654A, the Representation/Association is Note 6655A, the Type is GDT 6656A, and the Type Name is Note 6657A. The Cardinality is zero or one 6658A.

For the Change ID 6659A, the Category is Element 6660A, the Object Class is Business Transaction Document Product 6661A, the Property is Change Identification 6662A, the Representation/Association is Identifier 6663A, the Type is GDT 6664A, and the Type Name is product Change ID 6665A. The Cardinality is zero or one 6666A.

For the Discontinuation Indicator 6666A, the Category is Element 6667A, the Object Class is Business Transaction Document Product 6668A, the Property is Discontinuation 6669A, the Representation/Association is Indicator 6670A, the Type is GDT 6671A, and the Type Name is product Discontinuation Indicator 6672A. The Cardinality is zero or one 6673A.

For the Package Quantity 6674A, the Category is Element 6675A, the Object Class is Business Transaction Document Product 6676A, the Property Qualifier is Package 6677A, the Property is Quantity 6678A, the Representation/Association is Quantity 6679A, the Type term is GDT 6680A, and the Type Name term is Quantity 6681A. The Cardinality is zero or one 6682A.

InternalID refers to a proprietary identifier for the product that is used when both sender and recipient can access shared master data (extended enterprise). StandardID refers to a standardized identifier for this product, whose identification scheme may be managed by an agency from the DE 3055 code list. BuyerID refers to an identifier that is used proprietarily by the BuyerParty for this product. SellerID refers to an identifier that is used proprietarily by the SellerParty for this product. ProductRecipientID refers to an identifier that is used proprietarily by the ProductRecipientParty for this product. VendorID refers to an identifier that is used proprietarily by the VendorParty for this product. ManufacturerID refers to an identifier that is used proprietarily by the ManufacturerParty for this product. BillToID refers to an identifier that is used proprietarily by the BillToParty for this product. BillFromID refers to an identifier that is used proprietarily by the BillFromParty for this product. BidderID refers to an identifier that is used proprietarily by the BidderParty for this product. Type Code refers to coded representation of the type of a product such as "1" for material and "2" for service product. Note refers to a product description. ChangeID refers to an unique identifier for a change to a product that has no effect on the properties that are relevant for the user. DiscontinuationIndicator indicates whether the offering of a product is to be discontinued, i.e., removed from the line. PackageQuantity refers to an amount per container (package amount). The amount per container may be necessary if different package quantities are relevant, but the same product ID can have different package quantities depending on the item. This information is also variable movement data at time of the message.

The different IDs of a CDT BusinessTransactionDocumentProduct 6600 may identify the same product. Identification of a product can take place by an InternalID when sender and recipient can access shared master data, by a StandardID when sender and recipient can manage standardized identifiers, or by a ProductPartyIDs when sender and recipient are interested in the ProductIDs assigned by the parties involved.

Of all of the IDs available to the sender, IDs that the recipient is expected to understand may be used in a message.

(ff) BusinessTransactionDocumentProductCategory

A CDT BusinessTransactionDocumentProductCategory 6700 contains the information that is exchanged—for example, in accordance with common business understanding—in business documents about a product category. It identifies the product category using an internal ID, a standard ID, and IDs assigned by parties involved. A product category is a division of products according to objective criteria. An ID assigned by a party identifies in the name the role the assigning party plays in the business transaction. At present, roles are Buyer, Seller, ProductRecipient, Vendor, BillTo, BillFrom and Bidder. An example of CDT BusinessTransactionDocumentProductCategory 6700 is:

```
<BusinessTransactionDocumentProductCategory>
        <StandardID schemeID="UNSPSC" schemeVersionID="11.0"
schemeAgencyID="257">4711</StandardID>
        <BuyerID>1234</BuyerID>
        <SellerID>2345</SellerID>
</BusinessTransactionDocumentProductCategory>.
```

In this example, SchemeID="UNSPSC" indicates that it is the scheme "United Nations Standard Product and Services Classification Code", SchemeVersionID="11.0" indicates the version of the scheme, and schemeAgencyID="257" corresponds to the Agency "ECCMA" (Electronic Commerce Code Management Association) according to the code list DE 3055.

The structure of CDT Business Transaction Document Product Category 6700 is depicted in FIG. 67. For the CDT Business Transaction Document Product Category 6700, the Object Class is Business Transaction Document Product Category 6702, and the Representation/Association term is Details 6704.

For the Internal ID 6706, the Category is Element 6708, the Object Class is Business Transaction Document Product Category 6710, the Property Qualifier term is Internal 6712, the Property is Identification 6714, the Representation/Association term is Identifier 6716, the Type term is CDT 6718, and the Type Name term is Product Category Internal ID 6720. The Cardinality is zero or one 6722.

For the Standard ID 6724, the Category is Element 6726, the Object Class is Business Transaction Document Product Category 6728, the Property Qualifier term is Standard 6730, the Property is Identification 6732, the Representation/Association term is Identifier 6734, the Type term is CDT 6736, and the Type Name is Product Category Standard ID 6738. The Cardinality is from zero to n 6740.

For the Buyer ID 6742, the Category is Element 6744, the Object Class is Business Transaction Document Product Category 6746, the Property Qualifier term is Buyer 6748, the Property is Identification 6750, the Representation/Association term is Identifier 6767, the Type term is CDT 6754, and the Type Name is Product Category Party ID 6756. The Cardinality is zero or one 6758.

For the Seller ID 6760, the Category is Element 6762, the Object Class is Business Transaction Document Product Category 6764, the Property Qualifier term is Seller 6766, the Property is Identification 6768, the Representation/Association term is Identifier 6770, the Type term is CDT 6772, and the Type Name term is Product Category Party ID 6774. The Cardinality is zero or one 6776.

For the Product Recipient ID 6778, the Category is Element 6780, the Object Class is Business Transaction Document Product Category 6782, the Property Qualifier term is Product Recipient 6784, the Property is Identification 6786, the Representation/Association term is Identifier 6788, the Type term is CDT 6790, and the Type Name term is Product Category Party ID 6792. The Cardinality is zero or one 6794.

For the Vendor ID 6796, the Category is Element 6798, the Object Class is Business Transaction Document Product Category 6799, the Property Qualifier term is Vendor 6701A, the Property is Identification 6702A, the Representation/Association term is Identifier 6703A, the Type term is CDT 6704A, and the Type Name term is Product Category Party ID 6705A. The Cardinality is zero or one 6706A.

For the Bill To ID 6707A, the Category is Element 6708A, the Object Class is Business Transaction Document Product Category 6709A, the Property Qualifier term is Bill To 6710A, the Property is Identification 6711A, the Representation/Association term is Identifier 6712A, the Type term is CDT 6713A, and the Type Name term is Product Category Party ID 6714A. The Cardinality is zero or one 6715A.

For the Bill From ID 6716A, the Category is Element 6717A, the Object Class is Business Transaction Document Product Category 6718A, the Property Qualifier term is Bill From 6719A, the Property is Identification 6720A, the Representation/Association term is Identifier 6721A, the Type term is CDT 6722A, and the Type Name term is Product Category Party ID 6723A. The Cardinality is zero or one 6724A.

For the Bidder ID 6725A, the Category is E 6726A, the Object Class is Business Transaction Document Product Category 6727A, the Property Qualifier term is Bidder From 6728A, the Property is Identification 6729A, the Representation/Association term is Identifier 6730A, the Type term is CDT 6731A, and the Type Name term is Product Category Party ID 6732A. The Cardinality is zero or one 6733A.

InternalID refers to a proprietary identifier for the product category that is used when both sender and recipient can access shared master data (extended enterprise). StandardID refers to a standardized identifier for this product category whose identification scheme may be managed by an agency from the DE 3055 code list. BuyerID refers to an identifier that is used proprietarily by the BuyerParty for this product category. SellerID refers to an identifier that is used proprietarily by the SellerParty for this product category. ProductRecipientID refers to an identifier that is used proprietarily by the ProductRecipientParty for this product category. VendorID refers to an identifier that is used proprietarily by the VendorParty for this product category. BillToID refers to an identifier that is used proprietarily by the BillToParty for this product category. BillFromID refers to an identifier that is used proprietarily by the BillFromParty for this product category. BidderID refers to an identifier that is used proprietarily by the BidderParty for this product category.

The different IDs of a CDT BusinessTransactionDocumentProductCategory 6700 may identify the same product category. A product category may be identified by the ProductCategoryInternalID when sender and recipient can access shared master data, by the ProductCategoryStandardID when sender and recipient can manage standardized identifiers, or by the ProductCategoryPartyIDs when sender or recipient are interested in the ProductCategoryIDs assigned by the parties involved. Of the IDs available to the sender, IDs that the recipient is expected to understand may be used in a message. At least one ID may be specified.

The CDT BusinessTransactionDocumentProductCategory 6700 is used in messages for internal and external communication to transmit required information about a product category.

(gg) BusinessTransactionDocumentPublicIndicator

A GDT BusinessTransactionDocumentPublicIndicator 6800 indicates whether or not a business document is public. "Public" in this case means that access to the business document is not restricted in any way and the document is published in a standard place. An example of GDT BusinessTransactionDocumentPublicIndicator 6800 is: <RFQPublicIndicator>true</RFQPublicIndicator>.

The structure of CDT Business Transaction Document Public Indicator 6800 is depicted in FIG. 68. For the CDT Business Transaction Document Public Indicator 6800, the Object Class is Business Transaction Document 6802, the Property is Public Indicator 6804, the Representation/Association term is Indicator 6806, the Type term is CCT 6808, and the Type Name term is Indicator.

GDT BusinessTransactionDocumentPublicIndicator 6800 may have the value true or false. True indicates that the business document is public. False indicates that the business document is not public.

The GDT BusinessTransactionDocumentPublicIndicator 6800 may be used in a bid invitation to indicate whether the bid invitation is open to the public or limited to an exclusive group of participants. It therefore indicates to potential participants whether the group of fellow bidders may be restricted in advance.

When the GDT is used, the name component "BusinessTransactionDocument" is replaced with an actual BusinessTransactionDocumentType, e.g., PurchaseOrder, RFQ, and the like.

(hh) BusinessTransactionDocumentReference

A GDT BusinessTransactionDocumentReference 6900 is a unique reference to other business documents that are important within the respective business process. Furthermore, it is also possible to have references to one or more line items within the same business document. An example of GDT BusinessTransactionDocumentReference 6900 is:

```
<PurchaseOrderReference>
    <ID>102321</ID>
    <ItemID>1</ItemID>
</PurchaseOrderReference>.
```

The structure of CDT Business Transaction Document Reference 6900 is depicted in FIG. 69. For the CDT Business Transaction Document Reference 6900, the Object Class is Business Transaction Document Reference 6902, and the Representation/Association term is Details 6904.

For the ID 6906, the Category is Element 6908, the Object Class is Business Transaction Document Reference 6910, the Property is Identification 6912, the Representation/Association term is Identifier 6914, the Type term is GDT 6916, and the Type Name is Business Transaction Document ID 6918. The Cardinality is zero or one 6920.

For the Item ID 6922, the Category is Element 6924, the Object Class is Business Transaction Document Reference 6926, the Property is Item Identification 6928, the Representation/Association term is Identifier 6930, the Type term is GDT 6932, and the Type Name is Business Transaction Document Item ID 6934. The Cardinality is from zero to n 6936.

The business process role of the issuer of the referenced document does not occur in the GDT; rather, it is defined explicitly in the name, such as PurchaseContractReference and SalesContractReference. "DocumentReference" can be used for referencing relevant documents within a business process. They are used as a reference asset for the respective business document. It is also possible to reference the individual items of the respective documents. For example, within the "Order" document, references can be created to the business documents "Quote," "Contract," "PurchaseOrder," as well as to their individual item lines.

"BusinessTransactionDocument" may be replaced by the description of each document in the XML instance, e.g., "PurchaseOrder" for a purchase order, "Delivery" for a delivery, and the like.

(ii) BusinessTransactionDocumentSettlementRelevanceIndicator

A GDT BusinessTransactionDocumentSettlementRelevanceIndicator 7000 indicates whether a given Business Transaction document or one of its items should be settled or not. Settlement incorporates both billing and invoice verification. An example of GDT BusinessTransactionDocumentSettlementRelevanceIndicator 7000 is: <BusinessTransactionDocumentSettlementRelevanceIndicator>true</BusinessTransactionDocumentSettlementRelevanceIndicator>.

The structure of GDT Business Transaction Document Settlement Relevance Indicator 7000 is depicted in FIG. 70. For the GDT Business Transaction Document Settlement Relevance Indicator 7000, the Object Class is Business Transaction Document 7002, the Property is Settlement Relevance Indicator 7004, the Representation/Association term is Indicator 7006, the Type term is CCT 7008, and the Type Name term is Indicator 7010.

The GDT BusinessTransactionDocumentSettlementRelevanceIndicator 7000 may have the value true or false. True indicates that the document or an item in the document should be settled. False indicates that the document or an item in the document should not be settled.

The GDT BusinessTransactionDocumentSettlementRelevanceIndicator 7000 may be applied to business documents that are created when products are ordered, goods are delivered, or services are provided, or that transmit information from such business documents. It can be applied to the entire document or to individual items.

If it is transmitted with the value "true" for an entire document or one of that document's items, the whole document or the marked item is settled. References are used to ensure that additional information is taken into account.

If the indicator is transmitted with the value "false" for an entire document or one of that document's items, then the whole document or the marked item is not settled. References can be used to ensure that transmitted information is also taken into account during settlement of documents/items that are transmitted with an indicator with value 'true'.

In one example, if an Order Management credit memo request prompts the creation of a credit memo in billing, then the credit memo request will be transferred with the indicator value set to "true."

In another example, if an Order Management standard order needs to be taken into account during the billing of the deliveries that resulted from it, then that standard order is transferred with the indicator set to "false," and the subsequent delivery document with the indicator set to "true." The references in the delivery document to the items in the standard order ensure that the standard order is then taken into account during settlement.

In an example, the BusinessTransactionDocumentSettlementRelevanceIndicator corresponds to "billing relevance" in R/3 or CRM, with which it is additionally possible, however, to control which quantities should be settled when.

(jj) BusinessTransactionDocumentShipFromLocation

A CDT BusinessTransactionDocumentShipFromLocation 7100 contains the information that is exchanged in business documents about a location relevant for business transactions and from which goods or services are shipped. The information identifies the location, its address, and, if necessary, a different loading location. The identification may be a company-internal ID, a standardized ID, or one or more partner-specific IDs. A location is a logical or a physical place. An ID assigned by a party identifies in the name the role the assigning party occupies in the business transaction. Roles may include Buyer, Seller, ProductRecipient, and Vendor. An example of CDT BusinessTransactionDocumentShipFromLocation 7100 is:

```
<ReplenishmentOrder>
    ...
    <ShipFromLocation>
        <StandardID schemeAgencyID="016">4711</StandardID>
        <BuyerID>9873</BuyerID>
        <SellerID>487847</SellerID>
        <Address>...</Address>
        <LoadingLocation>...</LoadingLocation>
    <ShipFromLocation>
<ReplenishmentOrder>.
```

The structure of CDT Business Transaction Document Ship From Location 7100 is depicted in FIG. 71. For the CDT Business Transaction Document Ship From Location 7100, Object Class is Business Transaction Document Ship From Location 7102, and the Representation/Association term is Details 7104.

For the Internal ID 7106, the Category is Element 7108, the Object Class is Business Transaction Document Ship From Location 7110, the Property Qualifier term is Internal 7112, the Property is Identification 7114, the Representation/Association term is Identifier 7116, the Type term is CDT 7118, and the Type Name term is Location Internal ID 7120. The Cardinality is zero or one 7122.

For the Standard ID 7124, the Category is Element 7126, the Object Class is Business Transaction Document Ship From Location 7128, the Property Qualifier term is Standard 7130, the Property is Identification 7132, the Representation/Association term is Identifier is 7134, the Type term is 7136, and the Type Name term is Location Standard ID 7138. The Cardinality is zero or one 7140.

For the Buyer ID 7142, the Category is Element 7144, the Object Class is Business Transaction Document Ship From Location 7146, the Property Qualifier term is Buyer 7148, the Property is Identification 7150, the Representation/Association term is Identifier 7152, the Type term is CDT 7154, and the Type Name term is Location Party ID 7156. The Cardinality is zero or one 7158.

For the Seller ID 7160, the Category is Element 7162, the Object Class is Business Transaction Document Ship From Location 7164, the Property Qualifier term is Seller 7166, the Property is Identification 7168, the Representation/Association term is Identifier 7170, the Type term is CDT 7172, and the Type Name term is Location Party ID 7174. The Cardinality is zero or one 7176.

For the Product Recipient ID 7178, the Category is Element 7180, the Object Class is Business Transaction Document Ship From Location 7182, the Property Qualifier term is Product Recipient 7184, the Property is Identification 7186, the Representation/Association term is Identifier 7188, the Type term is CDT 7190, and the Type Name term is Location Party ID 7192. The Cardinality is zero or one 7194.

For the Vendor ID 7196, the Category is Element 7198, the Object Class is Business Transaction Document Ship From Location 7199, the Property Qualifier term is Vendor 7101A, the Property is Identification 7102A, the Representation/Association term is Identifier 7103A, the Type term is CDT 7104A, the and Type Name term is Location Party ID 7105A. The Cardinality is zero or one 7106A.

For the Address 7107A, the Category is Element 7108A, the Object Class is Business Transaction Document Ship From Location 7109A, the Property is Address 7110A, the Representation/Association term is Address 7111A, the Type term is GDT 7112A, and the Type Name term is Address 7113A. The Cardinality is zero or one 7114A.

For the Note 7115A, the Category is Element 7116A, the Object Class is Business Transaction Document Ship From Location 7117A, the Property is Note 7118A, the Representation/Association term is Text 7119A, the Type term is GDT 7120A, and the Type Name term is Note 7121A. The Cardinality is zero or one 7122.

For the Loading Location 7123A, the Category is Element 7124A, the Object Class is Business Transaction Document Ship From Location 7125A, the Property is Loading Location 7126A, the Representation/Association term Business Transaction Document Location 7127A, the Type term is GDT 7128A, and the Type Name term is Business Transaction Document Location 7129A. The Cardinality is zero or one 7130A.

InternalID refers to a proprietary identifier that is used when both sender and recipient can access shared master data (extended enterprise). StandardID refers to a standardized identifier for this location, whose identification scheme may be managed by an agency from the DE 3055 code list. BuyerID refers to an identifier that is used proprietarily by the BuyerParty for this location. SellerID refers to an iIdentifier that is used proprietarily by the SellerParty for this location. ProductRecipientID refers to an identifier that is used proprietarily by the ProductRecipientParty for this location. VendorID refers to an identifier that is used proprietarily by the VendorParty for this location. Address refers to an address that describes the location by indicating postal address, geographic coordinates, and the like. Note refers to an additional information such as directions. LoadingLocation refers to one loading location. The loading locations is a location itself and can be identified proprietarily or partner-specifically.

When defining addresses, organization addresses are supported. The different IDs of a BusinessTransactionDocumentShipFromLocation may identify the same location. A location may be identified by the InternalID when sender and recipient can access shared master data, by the StandardID when sender and recipient can manage standardized identifiers or by the PartyIDs when sender and recipient are interested in the PartyIDs assigned by the parties involved. Of the IDs available to the sender, those that the recipient is expected to understand may be used.

(kk) BusinessTransactionDocumentShipToLocation

A CDT BusinessTransactionDocumentShipToLocation 7200 contains the information that is exchanged in business documents about a location relevant for business transactions and to which goods or services are shipped. This information identifies the location, its address and, if necessary, a different unloading location. The identification may be a company-internal ID, a standardized ID, or one or many partner-specific IDs. A location is a logical or a physical place. An ID assigned by a party identifies in the name the role the assigning party plays in the business transaction. Roles include Buyer, Seller, Product-Recipient, and Vendor. An example of CDT BusinessTransactionDocumentShipToLocation 7200 is:

```
<ReplenishmentOrder>
    ...
    <ShipToLocation>
        <StandardID schemeAgencyID="016">4711</StandardID>
        <SellerID>487847</SellerID>
        <Address>...</Address>
        <UnloadingLocation>...</UnloadingLocation>
    </ShipToLocation>
</ReplenishmentOrder>.
```

The structure of CDT Business Transaction Document Ship To Location 7200 is depicted in FIG. 72. For the CDT Business Transaction Document Ship To Location 7200, Object Class is Business Transaction Document Ship To Location 7202, and the Representation/Association term is Details 7204.

For the CDT Internal ID 7206, the Category is Element 7208, the Object Class is Business Transaction Document Ship To Location 7210, the Property Qualifier term is Internal 7212, the Property is Identification 7214, the Representation/Association term is Identifier 7216, the Type term is CDT 7218, and the Type Name term is Location Internal ID 7220. The Cardinality is zero or one 7222.

For the CDT Standard ID 7224, the Category is Element 7226, the Object Class is Business Transaction Document Ship To Location 7228, the Property Qualifier term is Standard 7230, the Property is Identification 7232, the Representation/Association term is Identifier 7234, the Type term is CDT 7236, the Type Name term is Location Standard ID 7238, and the Cardinality is zero or one 7240.

For the Buyer ID 7242, the Category is E 7244, the Object Class is Business Transaction Document Ship To Location 7246, the Property Qualifier term is Buyer 7248, the Property is Identification 7250, the Representation/Association term is Identifier 7252, the Type term is CDT 7254, the Type Name term is Location Party ID 7256, and the Cardinality is zero or one 7258.

For the Seller ID 7260, the Category is Element 7262, the Object Class is Business Transaction Document Ship To Location 7264, the Property Qualifier term is Seller 7266, the Property is Identification 7268, the Representation/Association term is Identifier 7270, the Type term is CDT 7272, the Type Name term is Location Party ID 7274, and the Cardinality is zero or one 7276.

For the Product Recipient ID 7278, the Category is Element 7280, the Object Class is Business Transaction Document Ship To Location 7282, the Property Qualifier term is Product Recipient 7284, the Property is Identification 7286, the Representation/Association term is Identifier 7288, the Type term is CDT 7290, the Type Name term is Location Party ID 7292, and the Cardinality is zero or one 7294.

For the Vendor ID 7296, the Category is Element 7298, the Object Class is Business Transaction Document Ship To Location 7299, the Property Qualifier term is Vendor 7201A, the Property is Identification 7201A, the Representation/Association term is Identifier 7202, the Type term is CDT 7203A, the Type Name term is Location Party ID 7204, and the Cardinality is zero or one 7205A.

For the Address 7206A, the Category is E 7207A, the Object Class is Business Transaction Document Ship To Location 7208A, the Property is Address 7209A, the Representation/Association term is Address 7210A, the Type term is GDT 7211, the Type Name term is Address 7212A, and the Cardinality is zero or one 7213A.

For the Note 7214A, the Category is Element 7215A, the Object Class is Business Transaction Document Ship To Location 7216, the Property is Note 7217A, the Representation/Association term is 7218A, the Type term is GDT 7219A, the Type Name term is Note 7220A, and the Cardinality is zero or one 7221A.

For the Unloading Location 7222A, the Category is Element 7223A, the Object Class is Business Transaction Document Ship To Location E 7224A, the Property is Unloading Location 7225A, the Representation/Association term is Business Transaction Document Location 7226A, the Type term is GDT 7227A, the Type Name term is Business Transaction Document Location 7228A, and the Cardinality is zero or one 7229A.

InternalID refers to a proprietary identifier that is used when both sender and recipient can access shared master data. StandardID refers to a standardized identifier for this location, whose identification scheme may be managed by an agency from the DE 3055 code list. BuyerID refers to an identifier that is used proprietarily by the BuyerParty for this location. SellerID refers to an iIdentifier that is used proprietarily by the SellerParty for this location. ProductRecipientID refers to an identifier that is used proprietarily by the ProductRecipientParty for this location. VendorID refers to an identifier that is used proprietarily by the VendorParty for this location. Address refers to an address that describes the location by indicating postal address, geographic coordinates, and the like. Note refers to an additional information such as directions. UnLoadingLocation refers to an unloading location. The unloading location is a location itself and therefore can be identified proprietarily or partner-specifically.

When defining addresses, organization addresses may be supported. The different IDs of a CDT BusinessTransactionDocumentShipToLocation 7200 may identify the same location. A location may be identified by the InternalID when sender and recipient can access shared master data, by the StandardID when sender and recipient can manage standardized identifiers, or by the PartyIDs when sender and recipient are interested in the IDs assigned by the parties involved. Of the IDs available to the sender, those that the recipient is expected to understand may be used.

(ll) BusinessTransactionDocumentTransshipmentLocation

A CDT BusinessTransactionDocumentTransshipmentLocation 7300 contains the information that is exchanged in business documents about a relevant location for business transactions where goods are transshipped (unloaded and reloaded). This information identifies the location, its address, a loading location, and an unloading location. The identification may be a company-internal ID, a standardized ID, or one or more partner-specific IDs. A location is a logical or a physical place. An ID assigned by a party identifies in the name the role the assigning party plays in the business transaction. Roles include Buyer, Seller, ProductRecipient, and Vendor. An example of CDT BusinessTransactionDocumentTransshipmentLocation 7300 is:

```
<ReplenishmentOrder>
    ...
    <TransshipmentLocation>
        <StandardID schemeAgencyID="016">4711</StandardID>
        <Address>...</Address>
        <LoadingLocation>...</LoadingLocation>
        <UnloadingLocation>...</UnloadingLocation>
    <TransshipmentLocation>
</ReplenishmentOrder>.
```

The structure of CDT Business Transaction Document Transshipment Location 7300 is depicted in FIG. 73. For the CDT Object Class is 7302, the Representation/Association term is Details 7304.

For the Internal ID 7306, the Category is Element 7308, the Object Class is Business Transaction Document Transship Location 7310, the Property Qualifier term is Internal 7312, the Property is Identification 7314, the Representation/Association term is Identifier 7316, the Type term is CDT 7318, the Type Name term is Location Internal ID 7320, and the Cardinality is zero or one 7322.

For the Standard ID 7324, the Category is Element 7326, the Object Class is Business Transaction Document Transship Location 7328, the Property Qualifier term is Internal 7328, the Property is Identification 7330, the Representation/Association term is Identifier 7332, the Type term is CDT 7334, the Type Name term is Location Internal ID 7336, and the Cardinality is zero or one 7338.

For the Buyer 7340, the Category is Element 7342, the Object Class is Business Transaction Document Transship Location 7344, the Property Qualifier term is Buyer 7346, the Property is Identification 7348, the Representation/Association term is Identifier 7350, the Type term is CDT 7352, the Type Name term is Location Party ID 7354, and the Cardinality is zero or one 7356.

For the Seller ID 7358, the Category is Element 7360, the Object Class is Business Transaction Document Transship Location 7362, the Property Qualifier term is Seller 7364, the Property is Identification 7366, the Representation/Association term is Identifier 7368, the Type term is CDT 7370, the Type Name term is Location Party ID 7372, and the Cardinality is zero or one 7374.

For the Product Recipient 7376, the Category is Element 7378, the Object Class is Business Transaction Document Transship Location 7380, the Property Qualifier term is Product Recipient 7382, the Property is Identification 7384, the Representation/Association term is Identifier 7386, the Type term is CDT 7388, the Type Name term is Location Party ID 7390, and the Cardinality is zero or one 7392.

For the Vendor ID 7394, the Category is Element 7396, the Object Class is Business Transaction Document Transship Location 7398, the Property Qualifier term is Vendor 7399, the Property is Identification 7301A, the Representation/Association term is Identifier 7302A, the Type term is CDT 7303A, the Type Name term is Location Party ID 7304A, and the Cardinality is zero or one 7305A.

For the Address 7306A, the Category is Element 7307A, the Object Class is Business Transaction Document Transship Location 7308A, the Property is 7309A, the Representation/Association term is Address 7310A, the Type term is GDT 7311A, the Type Name term is Address 7312A, and the Cardinality is zero or one 7313A.

For the Note 7314A, the Category is Element 7315A, the Object Class is Business Transaction Document Transship Location 7316A, the Property is Note 7317A, the Representation/Association term is Text 7318A, the Type term is GDT 7319A, the Type Name term is Note 7320A, and the Cardinality is zero or one 7321A.

For the Loading Location 7322A, the Category is Element 7323A, the Object Class is Business Transaction Document Transship Location 7324A, the Property is Loading Location 7325A, the Representation/Association term is Business Transaction Document Location 7326A, the Type term is GDT 7327A, the Type Name term is Business Transaction Document Location 7328A, and the Cardinality is zero or one 7329A.

For the Unloading Location 7330A, the Category is Element 7331A, the Object Class is Business Transaction Document Transshipment Location 7332A, the Property is Unloading Location 7333A, the Representation/Association term is Business Transaction Document Location 7334A, the Type is GDT 7335A, the Type Name is Business Transaction Document Location 7336A, and the Cardinality is zero or one 7337A.

InternalID refers to a proprietary identifier that is used when both sender and recipient can access shared master data. StandardID refers to a standardized identifier for this location, whose identification scheme may be managed by an agency from the DE 3055 code list. BuyerID refers to an identifier that is used proprietarily by the BuyerParty for this location. SellerID refers to an iIdentifier that is used proprietarily by the SellerParty for this location. ProductRecipientID refers to an identifier that is used proprietarily by the ProductRecipientParty for this location. VendorID refers to an identifier that is used proprietarily by the VendorParty for this location. Address refers to an address that describes the location by indicating postal address, geographic coordinates, and the like. Note refers to an additional information such as directions. LoadingLocation refers to one loading location, which is a location itself and can be identified proprietarily or partner-specifically. UnLoadingLocation refers to an unloading location, which is also a location itself and therefore can be identified proprietarily or partner-specifically.

When defining addresses, organization addresses may be supported. The different IDs of a CDT BusinessTransactionDocumentTransshipmentLocation 7300 may identify the same location. A location may be identified by the InternalID when sender and recipient can access shared master data, by the StandardID when sender and recipient can manage standardized identifiers, or by the PartyIDs when sender and recipient are interested in the IDs assigned by the parties involved. Of the IDs available to the sender, those that the recipient is expected to understand may be used.

(mm) BusinessTransactionDocumentTypeCode

The GDT BusinessTransactionDocumentTypeCode 7400 is a coded representation of the type of a document that occurs in business transactions. The document type describes the nature of similar documents and defines the basic features of the documents of this type. An example of GDT BusinessTransactionDocumentTypeCode 7400 is: <BusinessTransactionDocumentTypeCode>001</BusinessTransactionDocumentTypeCode>.

The structure of GDT Business Transaction Document Type Code 7400 is depicted in FIG. 74. For the GDT Business Transaction Document Type Code 7400, the Object Class is Business Transaction Document 7402, the Property is Type 7404, the Representation/Association term is Code 7406, the Type term is CCT 7408, the Type Name term is Code 7410, the Length is three 7412. The GDT Business Transaction Document Type Code 7400 may be restricted 7414.

GDT BusinessTransactionDocumentTypeCode 7400 may have a value from 001 and 005. 001 indicates a purchase order. In an example, a PurchaseOrder is a request from a buying party to a seller to provide or deliver certain quantities of products on one or several dates. For the buying party, the commitments resulting from the request are legally binding for a certain period. On acceptance by the seller, they are binding for both parties. 002 indicates a sales contract, which is a framework agreement with a customer concerning the supply of products in a certain period. 003 indicates a Quote, which is an offer from a selling party to a buying party to supply or deliver products at predefined conditions. 004 indicates an invoice, which may be a legally binding notification concerning claims or liabilities for delivered products and services rendered. 005 indicates a credit memo, which is a notification to a beneficiary regarding an invoice that reduces the balance of the payment or liabilities.

The GDT BusinessTransactionDocumentTypeCode 7400 is used, for example, to categorize business transaction documents into messages if the document type is not already apparent based on the message. Applications provide "service-driven" interfaces—the messages of these interfaces can be filled from various applications from different underlying documents. However, the "service" application has to know the type of business transaction document in question such as the document type from which the message arose. For example DeliveryExecutionRequest refers to a consistent request to Logistics to prepare and execute goods receipts or deliveries, BillingDueNotification refers to a creation of the billing due list based on data from various applications and business documents, and PaymentDueNotification refers to a creation of payment dues based on data from various applications and business documents.

Messages correspond to business documents. Such a business document contains a business document object. A business document object may be a Business Transaction Document or a Master Data Document. The GDT BusinessTransactionDocumentTypeCode 7400 categorizes the Business Transaction Document.

In an example, in R/3, the BusinessTransactionDocumentTypeCode corresponds in principle, to VBTYP in Sales or BSTYP in Purchasing or MRM_REFERENZBELEG in Invoice Verification, and the like. The Code Names defined in the code list may also be used in the tag names of the XML instance for references to Business Transaction Documents.

(nn) BusinessTransactionExecutionStatusCode

The GDT BusinessTransactionExecutionStatusCode 7500 is an encoded representation of the status of the execution of a business transaction. An example of GDT BusinessTransactionExecutionStatusCode 7500 is:

<GoodsIssueExecutionStatusCode>3</GoodsIssueExecutionStatusCode>.

The structure of GDT Business Transaction Execution Status Code 7500 is depicted in FIG. 75. For the GDT Business Transaction Execution Status Code 7500, the Object Class is Business Transaction 7502, the Property is Execution Status Code 7504, the Representation/Association term is Code 7506, the Type term is CCT 7508, the Type Name term is Code 7510, and the Length is one 7512. The GDT Business Transaction Execution Status Code 7500 may be restricted 7514.

GDT BusinessTransactionExecutionStatusCode 7500 may have a proprietary code of 1, 2, or 3. 1 indicates that the execution of a business transaction has not yet started, 2 indicates that a business transaction is currently being executed, and 3 indicates that the execution of a business transaction has been completed.

When using the GDT BusinessTransactionExecutionStatusCode 7500 for a certain business transaction, the part of the name "BusinessTransaction" of the GDT is replaced by the English description of the business transaction. In an embodiment, business transactions from the code list of the GDT BusinessTransactionTypeCode 7500 are allowed. For example, the execution status of a "GoodsIssue" is specified by the GoodsIssueExecutionStatusCode and the execution status of a "GoodsPutaway" is specified by the GoodsPutawayExecutionStatusCode.

The execution status of a business transaction in Sales (Sales and Delivery) may be represented in R/3 by the data element STATV.

GDT BusinessTransactionBlockedIndicator 5300 indicates whether or not the execution of a business transaction is blocked. While the GDT BusinessTransactionExecutionStatusCode 7500 indicates the current execution status of a business transaction, the GDT BusinessTransactionBlockedIndicator 5300 shows whether or not the execution of a business transaction should start or be continued. For example, when a delivery is requested, it can also be requested that the delivery not be executed.

GDT BusinessTransactionCompletedIndicator 5400 indicates whether or not the execution of a business transaction has been completed. This indicator specifies whether or not a business transaction is regarded as completed, regardless of its execution status. For example, a delivery that is being executed can be considered completed, even though the entire quantity has not been delivered.

(oo) BusinessTransactionPriorityCode

The GDT BusinessTransactionPriorityCode 7600 is a coded representation of the ranking of a business transaction in terms of its urgency. The assignment of a priority always creates a sequence such that a unique predecessor-successor relationship exists between the individual values of a priority and they can be sorted uniquely. An example of GDT BusinessTransactionPriorityCode 7600 is: <PriorityCode>1</PriorityCode>.

The structure of GDT Business Transaction Priority Code 7600 is depicted in FIG. 76. For the GDT Business Transaction Priority Code 7600, the Object Class is Business Transaction 7602, the Property is Priority Code 7604, the Representation/Association term is Code 7606, the Type term is CCT 7608, the Type Name term is Code 7608, and the Length is one 7610. The GDT Business Transaction Priority Code 7600 may be restricted 7612.

For example, business transactions that are assigned a higher priority are more important, are required more urgent or have to be carried out first and are therefore considered first or are given preference during selection and processing.

The codes that may be used for GDT BusinessTransactionPriorityCode 7600 are 1, 2, 3, and 7. 1 means the transaction is to be done immediately, 2 means it is to be performed before any non-urgent task, 3 means it is to be done as routine work, and 7 means it is a low priority. The sequence of urgency is: 1, 2, 3, 7.

Priorities are assigned in nearly all business areas such as to specify delivery priorities, the urgency of an e-mail, posting priorities, deduction priorities, or urgency of a problem. For example, the delivery of product ABC is of particular importance to customer 4711. Therefore orders/order items containing this product are treated with preference and receive the delivery priority "immediate."

Since information describing priorities can be communicated in many different areas, the definition is kept general. In particular, in certain circumstances, the context determines which standard and therefore with which code list the "PriorityCode" should be communicated (e.g., "very high," "high," "medium," "low," or "A," . . . , "Z"). In an embodiment, proprietary code lists are used that were agreed upon by the communication partners individually.

For example, in the area of R/3 shipping, a delivery priority of the type NUMC, length 2.0, is used with codes 01 (High), 02 (Normal) and 03 (Low).

"BusinessTransaction" is replaced in the XML instance by the description of the respective business transaction, e.g., "delivery" (see Use for BusinessTransactionPriorityCodeDelivery in DeliveryTerms).

(pp) BusinessTransactionTypeCode

The GDT BusinessTransactionTypeCode 7700 is a coded representation of the type of a business transaction. A business transaction is a self-sufficient, logical commercial transaction that results in a value change, a quantity change, or an event. An example of GDT BusinessTransactionTypeCode 7700 is:

<BusinessTransactionTypeCode>0001</BusinessTransactionTypeCode>.

The structure of BusinessTransactionTypeCode is depicted in FIG. 77. For the GDT Business Transaction Execution Status Code 7700, the Object Class is Business Transaction 7702, the Property is Execution Status Code 7704, the Representation/Association term is Code 7706, the Type term is CCT 7708, the Type Name term is Code 7710, and the Length is one 7712. The GDT Business Transaction Execution Status Code 6000 may be restricted 7714 GDT.

GDT BusinessTransactionTypeCode 7700 is based on a proprietary code list. The data type is used for internal business processes or A2A interfaces. One possible value for BusinessTransactionTypeCode is 0001, which refers to Service Entry. A service entry is an entry for the type and scope of services provided by a seller. The entry is the basis for creating an invoice. A ServiceAcknowledgementRequest message can be sent based on the entry.

A GDT BusinessTransactionTypeCode 7700 may be used to provide accounting with information about the type of a business transaction, the quantities, amounts, and other data from this business transaction. In accounting, the business transaction type is a central control element for the document structure, account determination, and the like.

For a business application area (e.g., accounting), the GDT BusinessTransactionTypeCodes 7700 have the same level of detail. This means that there may be no refinement or grouping relationships between the codes of an area. The codes to be used from the code list in the interface are defined for each interface that uses the GDT BusinessTransactionTypeCode 7700. For every interface that uses the GDT BusinessTransactionTypeCode 7700 the admissable codes may be specified in the interface documentation.

Business transactions create or change BusinessTransactionDocuments. The data types GDT BusinessTransactionTypeCode 7700 and BusinessTransactionDocumentTypeCode are therefore closely related. Since complex business transactions (e.g., confirmation of a production order) create or change several business documents, however, in an embodiment, it may not be possible to create a simple (1:1 or 1:n) relationship between the code lists of these data types.

(qq) CashDiscount

A GDT CashDiscount 7800 is an agreement on the percentage of cash discount that is granted during a sales transaction when payment takes place within a certain number of days after the baseline date for payment has passed. An example of GDT CashDiscount 7800 is:

```
<MaximumCashDiscount>
    <DaysValue>15</DaysValue>
    <Percent>1.75</Percent>
</MaximumCashDiscount>.
```

The structure of GTD CashDiscount is depicted in FIG. 78. For the GDT Cash Discount term 7802 and the Representation/Association term is Code 7804.

GDT CashDiscount 7800 includes elements DaysValue and Percent from the core component type ‘numeric’. DaysValue is the number of days after the baseline payment date has passed. The number of days can be a whole number from 1 to 999.

For the Days Value Code 7806, the Category is Element, the Object Class is Cash Discount 7810, the Property is Days 6004, the Representation/Association term is Code 7814, the Type term is GDT 7816, the Type Name term is Code 7818, and the Length is from one to three 7820. The Cardinality is zero or one 7822.

Percent is the cash discount percentage rate. It is a decimal number with a maximum of two places before the decimal point and three places after the decimal point. For the Percent Code 7806, the Category is Element, the Object Class is Cash Discount 7828, the Property is Percent 6004, the Representation/Association term is Percent 783214, the Type term is GDT 783416, the Type Name term is Percent 7836, and the Length is maximum five digits with three places after the decimal point 7838. The Cardinality is zero or one 7840.

GDT CashDiscount 7800 is used in the Global Data Type CashDiscountTerms to define cash discount levels.

(rr) CashDiscountTerms

GDT CashDiscountTerms 7900 are payment conditions for goods and services. An example of GDT CashDiscountTerms 7900 is:

```
<CashDiscountTerms>
    <MaximumCashDiscount>
        <DaysValue>15</DaysValue>
        <Percent>1.75</Percent>
    </MaximumCashDiscount>
    <NormalCashDiscount>
        <DaysValue>30</DaysValue>
        <Percent>0.50</Percent>
    </NormalCashDiscount>
    <FullPaymentDueDaysValue>40</FullPaymentDueDaysValue>
</ CashDiscountTerms >.
```

The structure of GDT CashDiscountTerms 7900 is depicted in FIG. 79. The GDT Payment Baseline Date Terms 7900 includes elements scheme 7908, the Cash Discount term is 7910, the Property Payment Baseline Date term is 7912, the Representation/Association Date term is 7914, the Type term is GDT 7916, the Type Name term is Date 7918. The Cardinality is zero or one 7920.

For the GDT Maximum Cash Discount term is 7922 and includes element scheme 7924, the Cash Discount term is 7926, the Property Maximum Cash Discount term is 7928, the Representation/Association Details term is 7930, the Type term is GDT 7932, the Type Name term is Cash Discount 7934. The Cardinality is zero or one 7936.

For the GDT Maximum Cash Discount term is 7938 and includes element scheme 7940, the Cash Discount term is 7942, the Property Normal Cash Discount term is 7944, the Representation/Association Details term is 7946, the Type term is GDT 7948, the Type Name term is Cash Discount 7950. The Cardinality is zero or one 7952.

For the GDT Full Payment Due Days Value term is 7954 and includes element scheme 7956, the Cash Discount term is 7960, the Property Full Payment Due Days term is 7928, the Representation/Association Value term is 7964, the Type term is GDT 7966, the Type Name term is IntegerValue 7934, the Length is from one and 7970. The Cardinality is zero or one 7972.

PaymentBaselineDate refers to a payment baseline date such as the date from which the payment periods run. MaximumCashDiscount refers to the maximum cash discount for rapid payments. NormalCashDiscount refers to the normal cash discount. FullPaymentDueDaysValue refers to the number of days after the payment baseline date within which the full payment (e.g., of an invoice) should take place.

MaximumCashDiscount may be present when NormalCashDiscount is offered, as well. Therefore, NormalCashDiscount may be used if a cash discount percentage rate is specified. If both MaximumCashDiscount and NormalCashDiscount are specified, MaximumCashDiscount.DaysValue may be<NormalCashDiscount.DaysValue, and MaximumCashDiscount.Percent may be>NormalCashDiscount. Percent. MaximumCashDiscount.DaysValue<=NormalCashDiscount.DaysValue<=FullPaymentDueDaysValue may be true. The number of days in FullPaymentDueDaysValue can be a whole number from 1 to 999. PaymentBaselineDate is specified when conditions for a concrete payment are transmitted, e.g., for an invoice. This element does not apply when the payment baseline date has not yet been set such as in the case of an order.

GDT CashDiscountTerms 7900 are used to establish payment conditions, e.g., for an order or when creating an invoice for goods and services.

(ss) CatalogueID

A GDT CatalogueID 8000 is a unique identifier for a catalog. A catalog is a systematically arranged directory of objects of a particular type that are identified uniquely within the catalog. An example of GDT CatalogueID 8000 is: <CatalogueID schemeID='ProductCatalogues' schemeAgencyID='123456789' schemeAgencySchemeAgencyID='16'>MyProducts2002</CatalogueID>.

The structure of GDT CatalogueID 8000 is depicted in FIG. 80. For the GDT CatalogueID 8000 the Object Class Catalog term is 8002, the Property Identification term is 8004, the Representation/Association Identifier term is 8006, the Type term is CCT 8008, the Type Name term is Identifier 8010, and the Length is from one to forty 8012. The CatalogueID may be restricted 8014.

GDT schemeID 8016 includes attribute scheme 8018, the Object Class Catalog term is 8020, the Property Identification term is 8022, the Representation/Association Identifier term is 8024, the Type term is xsd 8026, the Type Name term is Token 8028, the Length is from one to 60 8030. The Cardinality is zero or one 8032.

GDT schemeAgencyID 8034 includes attribute scheme 8036, the Object Class IndentificationSchemeAgency term is 8038, the Property Identification term is 8040, the Representation/Association Identifier term is 8042, the Type term is xsd 8044, the Type Name term is Token 8046, the Length is from 1 to 60 and 8048. The Cardinality is zero or one 8050.

GDT schemeAgencySchemeID 8052 includes attribute scheme 8054, the Object Class IdentificationSchemeAgency term is 8056, the Property Scheme term is 8058, the Representation/Association Identifier term is 8060, the Type term is xsd 8062, the Type Name term is Token 8064, the Length is from 1 to 60 and 8066. The Cardinality is zero or one 8068.

GDT schemeAgencySchemeAgencyID 8070 includes attribute scheme 8072, the Object Class IdentificationSchemeAgency term is 8074, the Property SchemeAgency term is 8076, the Representation/Association Identifier term is 8078, the Type term is xsd 8080, the Type Name term is Token 8082, the Length is three 8084. The Cardinality is zero or one 8086.

GDT CatalogueID 8000 is from the core component type (CCT) Identifier. CatalogueID is used to identify a catalog uniquely. Examples of typical catalogs are electronic product or vendor catalogs. The attributes schemeID, schemeAgencyID, schemeAgencySchemeID, and schemeAgencySchemeAgencyID are used in the same way as planned for the CCT Identifier, in order to define the context for which a CatalogueID is guaranteed to be unique.

(tt) CatalogueItemID

A GDT CatalogueItemID 8100 is the unique identifier for an object within a catalog and is unique within the context of the catalog. An example of GDT CatalogueItemID 8100 is: <CatalogueItemID>1AXX3332-0</CatalogueItemID>.

The structure of GDT CatalogueItemID 8100 is depicted in FIG. 81. For the GDT CatalogueItemID 8160, the Object Class CatalogueItem term is 8102, the Property Identification term is 8104, the Representation/Association Identifier term is 8106, the Type term is CCT 8108, the Type Name term is Identifier 8110, and the Length is from one to forty 8112. The GDT CatalogueItemID 8100 is 8114.

GDT CatalogueItemID 8100 is from the CCT Identifier. CatalogueItemID is a character string that has a maximum length of 40 characters and that conforms to the rules defined for xsd:token. CatalogueItemID is used to identify an object uniquely within a catalog.

(uu) CatalogueReference

A GDT CatalogueReference 8200 is a unique reference to a catalog or to an object within a catalog. A catalog is a list of objects of a particular type that are uniquely identified within the list and that have access functions for this list. An example of GDT CatalogueReference 8200 is:

```
<CatalogueReference>
    <CatalogueID schemeID='ProductCatalogues'
schemeAgencyID='123456789' schemeAgencySchemeAgencyID='16'>
MyProducts2002</CatalogueID>
  <CatalogueItemID>1AXX3332-0</CatalogueItemID>
  </CatalogueReference >.
```

The structure of GDT CatalogueReference 8200 is depicted in FIG. 82. For the GDT CatalogueReference 8200 the Object Class is CatalogueReference 8202 and the Representation/Association is Details 8204.

For ID 8206, the Category is Element 8208, the Object Class is CatalogueReference 8210, the Property Identification term is 8212, the Representation/Association term is Identifier 8214, the Type term is GDT 8216, the Type Name term is CatalogueID 8218, and the Cardinality is one 8220.

For ItemID 8222, the Category is Element 8224, the Object Class CatalogueReference term is 8226, the Property Item term is Identification 8228, the Representation/Association Identifier term is 8230, the Type term is GDT 8232, the Type Name term is CatalogueItemID 8234, and the Cardinality is from 0 to n 8236.

GDT CatalogueReference 8200 can be used to reference a catalog or an item within a catalog. For example, the "Order" document can contain references to a vendor's product catalog.

(vv) CatalogueSchemaID

A GDT CatalogueSchemaID 8300 is a unique identifier for a catalog schema. A catalog schema defines the structure of a catalog by means of sections which group together similar catalog objects, relationships between sections, and attributes which can be assigned to all the catalog items or to catalog items within a particular section. An example of GDT CatalogueSchemaID 8300 is: <CatalogueSchemaID>UNSPC</CatalogueSchemaID>.

The structure of GDT CatalogueSchemaID 8300 is depicted in FIG. 83. For the GDT CatalogueSchemeID 8300, the Object Class Catalogue Schema term is 8302, the Property is Identification 8304, the Representation/Association term is Identifier 8306, the Type term is CCT 8308, the Type Name term is Identifier 8310, the Length is from one to 40 8312, and the Cardinality is unrestricted 8314.

Characters used for GDT CatalogueSchemaID 8300 may include upper and lowercase characters from A to Z (without German umlauts), digits from 0 to 9, – (minus sign), _ (underscore), /, \, and. (period). No distinction is made between upper and lowercase characters.

GDT CatalogueSchemaID 8300 is used to identify a catalog schema uniquely within the catalog.

(ww) CatalogueSchemaTypeCode

The GDT CatalogueSchemaTypeCode 8400 is a coded representation of the type of a catalog schema. An example of GDT CatalogueSchemaTypeCode 8400 is:

<CatalogueSchemaTypeCode>01</CatalogueSchemaTypeCode>.

The structure of GDT CatalogueSchemaTypeCode 8400 is depicted in FIG. 84. For the GDT CatalogueSchemeID 8400, the Object Class Catalogue Schema term is 8402, the Property is Type 8404, the Representation/Association term is Code 8406, the Type term is CCT 8408, the Type Name term is Code 8410, and the Length is two 8412. The GDT CatalogueSchemaTypeCode 8400 may be restricted 8414.

Valid values for GDT CatalogueSchemaTypeCode 8400 are 01 and 02. 01 is a neutral schema, which is a schema without identifying the business significance. 02 is a schema for good groups.

(xx) CatalogueSectionID

A GDT CatalogueSectionID 8500 is a unique identifier for a catalog section. A catalog section is a means of structuring the contents of a catalog using a particular system. A section can contain additional sections, as well as catalog items and the attributes that describe the types of the items. An example of GDT CatalogueSectionID 8500 is:

<CatalogueSectionID>Bicycles</CatalogueSectionID>.

The structure of GDT CatalogueSectionID 8500 is depicted in FIG. 85. For the GDT CatalogueSectionID 8500 the Object Class Catalogue Section term is 8502, the Property is Identification 8504, the Representation/Association term is Identifier 8506, the Type term is CCT 8510, the Type Name term is Identifier 8510, and the Length is from one to forty 8512. The GDT CatalogueSectionID 8500 may be a restricted GDT.

The characters allowed for GDT CatalogueSectionID 8500 are upper and lowercase characters from A to Z (without German umlauts), digits from 0 to 9, – (minus sign), _ (underscore), /, \, and . (period). No distinction is made between upper and lowercase characters.

GDT CatalogueSectionID 8500 is used to identify a section uniquely within a catalog schema.

(yy) CatalogueSectionTypeID

A GDT CatalogueSectionTypeID 8600 is a unique identifier for a catalog section type. A catalog section type describes the nature of a catalog sections and defines a set of attributes that is assigned to a section of this type. An example of GDT CatalogueSectionTypeID 1700 is:

<CatalogueSectionTypeID>Vehicles<CatalogueSectionTypeID>.

The structure of GDT CatalogueSectionTypeID 8600 is depicted in FIG. 86. For the GDT CatalogueSectioTypeID 8600 the Object Class is Catalogue Section Type 8602, the Property is Identification 8604, the Representation/Association term is Identifier 6906, the Type term is CCT 8608, the Type Name term is Identifier 8610, and the Length is one 8612. The GDT CatalogueSectionTypeID 8600 may be a restricted GDT.

The characters allowed for GDT CatalogueSectionTypeID 8600 are upper and lowercase characters from A to Z (without German umlauts), digits from 0 to 9, – (minus sign), _ (underscore), /, \, and . (period). No distinction is made between upper and lowercase characters. No distinction is made between upper and lowercase characters.

The GDT CatalogueSectionTypeID 7100 may be unique in the context of the catalog.

(zz) CatalogueTypeCode

The GDT CatalogueTypeCode 8700 is a coded representation of the type of a catalog. This is determined by its business purpose, from which the basic attributes are derived. An example of GDT CatalogueTypeCode 8700 is:

<CatalogueTypeCode>01</CatalogueTypeCode>.

The structure of GDT CatalogueTypeCode 8700 is depicted in FIG. 87. For the GDT CatalogueTypeCode 8700 the Object Class is Catalog 8702, the Property is Type 8704, the Representation/Association term is Identifier 8706, the Type term is CCT 8708, the Type Name term is Code 8710, and the Length is one 8712. The GDT CatalogueTypeCode 8700 may be a restricted GDT.

Valid values for GDT CatalogueTypeCode 8700 are 01, 02, and 03. 01 refers to a catalog compiled by a company for its own use when purchasing products, 02 refers to a product catalog for one vendor for a purchasing company, and 03 refers to a purchase contract product catalog that contains those products that are included in a special contract with the conditions agreed in the contract. In one example, a purchasing catalog (code 01) could be SAP-B2B, for example. The company uses this catalog for purchasing. The products contained in the catalog can come from different vendors.

(aaa) CatalogueViewID

A GDT CatalogueViewID 8800 is a unique identifier for a catalog view. A catalog view is a subset of the information contained in the catalog. The view is determined by its catalog schemes, sections, and catalog items. In addition, individual attributes can be excluded from a view. An example of GDT CatalogueViewID 8800 is:

<CatalogueViewID>ManagerView</CatalogueViewID>.

The structure of GDT CatalogueViewID 8800 is depicted in FIG. 88. For the GDT CatalogueViewID 8800, the Object Class is Catalogue View 8802, the Property is Identification 8804, the Representation/Association term is Identifier 8806, the Type term is CCT 8808, the Type Name term is Identifier 8810, the Length is from one to forty 8812, and CatalogueViewID 8800 may be restricted 8814.

The characters allowed for GDT CatalogueViewID 8800 are upper and lowercase characters from A to Z (without German umlauts), digits from 0 to 9, – (minus sign), _ (underscore), /, \, and . (period). No distinction is made between upper and lowercase characters. No distinction is made between upper and lowercase characters.

The GDT CatalogueViewID 8800 may be in the context of the catalog to which the view belongs.

(bbb) CompleteTransmissionIndicator

The GDT CompleteTransmissionIndicator 8900 indicates whether an object transferred in a message or a transmitted list of similar objects is transmitted in its entirety or not. "Complete Transmission" means the complete transmission of data of the object that is relevant for the message type. "Complete Transmission" is independent of whether the data at the sender have changed since the last transmission. An example of GDT CompleteTransmissionIndicator 8900 is:

<CompleteTransmissionIndicator>true</CompleteTransmissionIndicator>.

The structure of GDT CompleteTransmissionIndicator 8900 is depicted in FIG. 89. For the GDT CompleteTransmission Indicator 8900, the Object Class is Complete Transmission 8902, the Property is Indicator 8904, the Representation/Association term is Indicator 8906, the Type term is CCT 8908, and the Type Name term is Indicator 8910.

The GDT CompleteTransmissionIndicator 8900 can have the value true or false. True indicates that the objects indicated by the indicator are transmitted in their entirety. False indicates that the objects indicated by the indicator are not transmitted in their entirety.

The GDT CompleteTransmissionIndicator 8900 is used for the business document object or for lists of objects. The GDT CompleteTransmissionIndicator 8900 can be used in various ways. First, it can be used for the leading business object of a message data type (business document object), to display its complete or incomplete transmission. In this example, the GDT CompleteTransmissionIndicator 8900 is an element of the business document object. If it is set to "true," then a business document object that already exists at the recipient of the message is replaced completely by the transmitted business document object. If it is set to "false," then those elements of the business document object that already exist at the recipient of the message for which data is transmitted are updated. All elements for which no data is transmitted remain unchanged.

In another example, GDT CompleteTransmissionIndicator 8900 may be used for a list of similar objects, to display the complete or incomplete transmission of the list. In this example, the GDT CompleteTransmissionIndicator 8900 is an element of the object that contains the list and has the name "xListCompleteTransmissionIndicator," where "x" is the name of the listed objects. If the GDT CompleteTransmissionIndicator 8900 is set to "true," the list is transmitted in its entirety with all objects. Objects that are not transmitted are implicitly considered to be deleted. Transmitted objects of the list can have an ActionCode, which may be fixed at the value "01" (Create). If the GDT CompleteTransmissionIndicator 8900 is set to "false," the list is not transmitted in its entirety with all objects. Objects that are not transmitted are considered to be unchanged. New objects or objects to be changed or deleted are transmitted. The action that is to be taken for an object in the list is controlled by the value of the assigned ActionCode, where either the hard or soft semantic may be used exclusively.

A GDT CompleteTransmissionIndicator 8900 that exists in a message type but is not filled is assumed by default to be "true." This ensures compatibility when enhancing interfaces to include a GDT CompleteTransmissionIndicator 8900. The GDT CompleteTransmissionIndicator 8900 can be used at different hierarchy levels within a message type. In order to ensure compatibility when enhancing interfaces with additional CompleteTransmissionIndicators, higher-level and lower-level CompleteTransmissionIndicators are not interdependent.

The following is one usage example of GDT CompleteTransmissionIndicator 8900:

```
<BusinessTransactionDocumentChangeRequest>
        <BusinessTransactionDocument>
            <ID>4800000123</ID>
            ...
    <ItemListCompleteTransmissionIndicator>false
</ItemListCompleteTransmissionIndicator>
            <Item>
                <ID>10</ID>
                <ActionCode>02</ActionCode>
                ...
    <ScheduleLineListCompleteTransmissionIndicator>true
</ScheduleLineListCompleteTransmissionIndicator>
                <ScheduleLine>
                    <ID>1</ID>
                    <ActionCode>01</ActionCode>
                    ...
                </ScheduleLine>
                <ScheduleLine>
```

-continued

```
                    <ID>3</ID>
                    <ActionCode>01</ActionCode>
                    ...
                </ScheduleLine>
            </Item>
            <Item>
                <ID>30</ID>
                <ActionCode>02</ActionCode>
                ...
    <ScheduleLineListCompleteTransmissionIndicator>false
</ScheduleLineListCompleteTransmissionIndicator>
                <ScheduleLine>
                    <ID>3</ID>
                    <ActionCode>03</ActionCode>
                </ScheduleLine>
            </Item>
        </BusinessTransactionDocument>
</BusinessTransactionDocumentChangeRequest>
```

In the usage example above, the message requests a change to the business transaction 4800000123. New or changed items in the business transaction, or items to be deleted, are transmitted in the message (ItemListCompleteTranmissionIndicator="false"). Item 10 is to be changed (ActionCode="02"). In item 10, all schedule lines are transmitted (ScheduleLineListCompleteTranmissionIndicator="true"). The ActionCode is fixed at "01" (Create) in schedule lines 1 and 3 of item 10 because ScheduleLineListCompleteTranmissionIndicator="true." Schedule line 2 is deleted implicitly, because it is not transmitted. Item 20 remains unchanged, because it is not transmitted. Item 30 is to be changed (ActionCode="02"). In item 20, new or changed schedule lines, or schedule lines to be deleted are transmitted (ScheduleLineListCompleteTranmissionIndicator="false"). Schedule lines 1 and 2 of item 30 remain unchanged, because they are not transmitted. Schedule line 3 of item 30 is deleted (ActionCode="03").

The default case for a message is complete transmission and this may be supported by every system. A business process can thus be recreated in the event of errors. To improve performance, support for the complete transmission at the segment level should detailed according to the performance requirements.

Which objects the GDT CompleteTransmissionIndicator 8900 refers to may be recognizable from the context of the interface in which a CompleteTransmissionIndicator is used. The meaning of a complete transmission of an object may be defined.

(ccc) ConsignmentIndicator

The GDT ConsignmentIndicator 9000 indicates whether the transaction form of the consignment is present or not. In an example, "Consignment" is a transaction form in which the vendor stores a material stock at the ordering party at the vendor's expense. The vendor is the owner of the materials until they are withdrawn from the consignment stores. The vendor is notified of the withdrawals at regular time intervals and the withdrawals are then settled accordingly. An example of GDT ConsignmentIndicator 9000 is: <ConsignmentIndicator>true</ConsignmentIndicator>.

The structure of ConsignmentIndicator is depicted in FIG. 90. For the GDT ConsignmentIndicator 9000, the Property term is Consignment Indicator 9002, the Representation/Association term is Indicator 9004, the Type term is CCT 9006, and the Type Name term is Indicator 9008.

The GDT ConsignmentIndicator 9000 can have the values true or false. True indicates that the transaction form of consignment is present. False indicates that the transaction form of consignment is not present.

(ddd) ContactPerson

A CDT ContactPerson 9100 is a natural person who is the contact person during the execution of business processes. CDT ContactPerson 9100 identifies the contact person and the contact person's address. Identification can occur using an internal ID and using IDs assigned by the parties involved. An ID assigned by a party identifies in the name the role the assigning party plays in the business transaction. Roles include Buyer, Seller, ProductRecipient, Vendor, BillTo, Bill-From and Bidder. An example of CDT ContactPerson 9100 is:

```
Example 1) PartyIDs
<ContactPerson>
    <BuyerID>9874</BuyerID>
    <SellerID>487848</SellerID>
    <Address>...</Address>
</ContactPerson>
Example 2) Internal ID
<ContactPerson>
    <InternalID schemeID="ContactPersonID" schemeAgencyID=
"BPL_300">737</InternalID>
    <Address>...</Address>
</ContactPerson>
```

In the above examples, schemeID="ContactPersonID" specifies that the scheme CDT ContactPersonID 9100 was used to identify the party, and schemeAgencyID="BPL__300" specifies that the scheme was assigned by the SAP CMDM system "BPL__300."

The structure of CDT ContactPerson 9100 is depicted in FIG. 91. The CDT ContactPerson 9100 includes elements InternalID 9106, BuyerID 9124, SellerID 9142, ProductRecipientID 9160, VendorID 9178, BillToID 9196, BillFromID 9107A, BidderID 9116A, and Address 9125A. For the CDT ContactPerson 9100, the Object Class is Contact Person 9102 and the Representation/Association term is Details 9104.

For the InternalId 9106, the Category is Element 9108, the Object Class is Contact Person 9110, the Property Qualifier term is Internal 9112, the Property is Identification 9114, the Representation/Association term is Identifier 9116, the Type term is CDT 9118, and the Type Name is ContactPersonInternalID 9120. The Cardinality between the CDT ContactPerson 9100 and the InternalID 9106 is zero or one 9122.

For the BuyerID 9124, the Category is Element 9126, the Object Class is Contact Person 9128, the Property Qualifier term is Buyer 9130, the Property is Identification 9132, the Representation/Association term is Identifier 9134, the Type term is CDT 9136, and the Type Name term is ContactPersonPartyID 9138. The Cardinality between the CDT ContactPerson 9100 and BuyerID 9124 is zero or one 9140.

For the SellerID 9142, the Category is Element 9144, the Object Class is Contact Person 9146, the Property Qualifier term is Seller 9148, the Property is Identification 9150, the Representation/Association term is Identifier 9152, the Type term is CDT 9154, and the Type Name is ContactPersonPartyID 9156. The Cardinality between the CDT ContactPerson 9100 and SellerID 9142 is zero or one 9158.

For the ProductRecipientID 9160, the Category is Element 9162, the Object Class is Contact Person 9164, the Property Qualifier term is Product Recipient 9166, the Property is Identification 9168, the Representation/Association term is Identifier 9170, the Type term is CDT 9172, and the Type Name is ContactPersonPartyID 9174. The Cardinality between the CDT ContactPerson 9100 and ProductRecipientID 9160 is zero or one 9176.

For the VendorID 9178, the Category is Element 9180, the Object Class is Contact Person 9182, the Property Qualifier term is Vendor 9184, the Property is Identification 9186, the Representation/Association term is Identifier 9188, the Type term is CDT 9190, and the Type Name term is ContactPersonPartyID 9192. The Cardinality between the CDT ContactPerson 9100 and VendorID 9178 is zero or one 9194.

For the BillToID 9196, the Category is Element 9198, the Object Class is 9199, the Property Qualifier term is 9101A, the Property is 9102A, the Representation/Association term is Identifier 9103A, the Type term is CDT 9104A, and the Type Name is ContactPersonPartyID 9105A. The Cardinality between the CDT ContactPerson 9100 and BillToID 9196 is zero or one 9106A.

For the BillFromID 9107A, the Category is Element 9108A, the Object Class is Contact Person 9109A, the Property Qualifier term is BillFrom 911A, the Property is Identification 9111A, the Representation/Association term is Identifier 9112A, the Type term is CDT 9113A, and the Type Name term is ContactPersonPartyID 9114A. The Cardinality between the CDT ContactPerson 9100 and BillFromID 9107A is zero or one 9115A.

For the BidderID 9116A, the Category is Element 9117A, the Object Class is Contact Person 9118A, the Property Qualifier term is Bidder 9119A, the Property is Identification 9120A, the Representation/Association term is Identifier 9121 A, the Type term is CDT 9122A, and the Type Name term is ContactPersonPartyID 9123A. The Cardinality between the CDT ContactPerson 9100 and BidderID 9116A is zero or one 9124A.

For the Address 9125A, the Category is Element 9126A, the Object Class is Contact Person 9127A, the Property is Address 9128A, the Representation/Association term is Address 9129A, the Type term is AGDT 9130A, and the Type Name term is Address 9131A. The Cardinality between the CDT ContactPerson 9100 and Address 9125A is zero or one 9132A.

InternalID refers to a proprietary identifier for the CDT ContactPerson 9100 that is used when both sender and recipient can access shared master data (extended enterprise). This may be a personnel number. BuyerID refers to an identifier that is used by the BuyerParty for this CDT ContactPerson 9100. SellerID refers to an identifier that is used by the SellerParty for this CDT ContactPerson 9100. ProductRecipientID refers to an identifier that is used by the ProductRecipientParty for this CDT ContactPerson 9100. VendorID refers to an identifier that is used by the VendorParty for this CDT ContactPerson 9100. BillToID refers to an identifier that is used by the BillToParty for this ContactPerson. BillFromID refers to an identifier that is used by the BillFromParty for this ContactPerson. BidderID refers to an identifier that is used by the BidderParty for this party. Address refers to a contact person's address The different IDs of a BusinessTransactionDocumentParty may identify the same CDT ContactPerson 9100. There is no StandardID for a CDT ContactPerson 9100. A contact person can therefore be identified using an internal ID, as well as by an ID assigned by an involved party. Thus, a CDT ContactPerson 9100 may be identified by the InternalId when sender and recipient can access shared master data or by the ContactPersonPartyIDs when sender and recipient are interested in the PartyIDs assigned by the parties involved Of the IDs available to the sender, IDs the recipient is expected to understand may be used in a message.

The address includes the elements of a personal address.

(eee) ContactPersonID

A GDT ContactPersonID 9200 is a unique identifier for a contact person. GDT ContactPersonID 9200 is a natural person who is the contact person during the execution of business processes. GDT ContactPersonID 9200 identifies the contact person and the contact person's address. An example of GDT ContactPersonID 9200 is:

```
<ContactPersonID schemeID="PartyID"
schemeAgencyID="BPL_300"
schemeAgencySchemeAgencyID="ZZZ">
    4711
</ContactPersonID>
```

In the above example, 4711 refers to a contact person in system BPL__300, and ZZZ refers to a proprietary Agency.

The structure of GDT ContactPersonID 9200 is depicted in FIG. 92. The GDT ContactPersonID 9200 includes attributes schemeID 9216, schemeAgencyID 9234, schemeAgencySchemeID 9252 and schemeAgencySchemeAgencyID 9270. For the GDT ContactPersonID 9200, the Object Class is ContactPerson 9202, the Property is Identification 9204, the Representation/Association term is Identifier 9206, the Type term is CCT 9208, the Type Name term is Identifier 9210, the Length is from 1 to 60 9212. The GDT ContactPersonID 9200 may be restricted 9214.

For the schemeID 9216, the Category is Attribute 9218, the Object Class is IdentificationScheme 9220, the Property is Identification is 9222, the Representation/Association term is Identifier 9224, the Type term is xsd 9226, the Type Name term is Token 9228, and the Length is from one to sixty 9230. The Cardinality between the ContactPersonID 9200 and the schemeID 9216 is zero or one 9232.

For the schemeAgencyID 9234, the Category is Attribute A9273, the Object Class is IdentificationSchemeAgency 9238, the Property is Identification 9240, the Representation/Association term is Identifier 9242, the Type term is xsd 9244, the Type Name term is Token 9246, and the Length is from one to sixty 9248. The Cardinality between the ContactPersonID is zero or one 9250.

For the schemeAgencySchemeID 9252, the Category is Attribute A9254, the Object Class is IdentificationSchemeAgency 9256, the Property is Scheme 9258, the Representation/Association term is Identifier 9260, the Type term is xsd 9262, the Type Name term is Token 9264, and the Length is from one to sixty 9266. The Cardinality is zero or one 9268.

For the schemeAgencySchemeAgencyID 9270, the Category is Attribute A9272, the Object Class is IdentificationSchemeAgency 9274, the Property is SchemeAgency 9276, the Representation/Association term is Identifier 9278, the Type term is xsd 9280, the Type Name term is Token 9282, and the Length is three 9284. The Cardinality is zero or one 9286.

Contact persons may be used as contact persons for a party, not for products, and the like. ContactPerson also identifies a contact person for a party. This can take place explicitly within the GDT BusinessTransactionDocumentParty or implicitly in a message. In the latter case, the party for which the contact person is being specified may be clear.

In an SAP MDM example, a contact person is a subtype of a party and can be identified like a party using a GUID or a PartyID.

(fff) ContactPersonInternalID

A CDT ContactPersonInternalID 9300 is a proprietary identifier for a contact person. ContactPerson is a natural person who is the contact person during the execution of business processes. An example of a CDT ContactPersonInternalID 9300 is:

GUID of a contact person:

```
<ContactPersonInternalID schemeID="PartyGUID"
schemeAgencyID="MPL_002">1C743CEC501F6A4D8826C7EC5A8554B9
</ContactPersonInternalID>
```

In the above example, schemeID="PartyGUID" indicates that the scheme "PartyGUID" was used to identify the contact person, and schemeAgencyID="MPL__002" indicates that the scheme was assigned by the business system "MPL__002."

The following is another example of a CDT ContactPersonInternalID 9300:

Party ID of a contact person:

<ContactPersonInternalID schemeID="PartyID" schemeAgencyID="MPL__002">4711</ContactPersonInternalID>

The structure of CDT ContactPersonInternalID 9300 is depicted in FIG. 93. The CDT ContactPersonInternalID 9300 includes attributes schemeID 9318 and schemeAgencyID 9336. For the CDT ContactPersonInternalID 9300, the Object Class is ContactPerson 9302, the Property Qualifier term is Internal 9304, the Property is Identification 9306, the Representation/Association term is Identifier 9308, the Type term is GDT 9310, the Type Name term is ContactPersonID 9312, and the Length is from one to thirty-two 9314. The CDT ContactPersonInternalID 9300 may be restricted 9316.

For the schemeID 9318, the Category is Attribute 9320, the Object Class is IdentificationScheme 9322, the Property is Identification 9324, the Representation/Association term is Identifier 9326, the Type term is xsd 9328, the Type Name term is Token 9330, and the length is from one to sixty 9332. The Cardinality is zero or one 9334.

For the schemeAgencyID 9336, the Category is Attribute 9338, the Object Class is IdentificationSchemeAgency 9340, the Property is Identification 9342, the Representation/Association term is Identifier 9344, the Type term is xsd 9346, the Type Name term is Token 9348, and the Length is from one to sixty 9350. The Cardinality is zero or one 9352.

In an example, the attributes of a ContactPersonInternalID may be filled in as follows in an SAP MDM. Scheme 'PartGUID' identifies a contact person using a Global Unique Identifier. SchemeID 'PartyID' identifies a contact person using an identification number. SchemeAgencyID is a business system in which the identifier was assigned.

The CDT ContactPersonInternalID 9300 represents a projection of the CDT ContactPersonID 9300, in which the attributes 'schemeID' and 'schemeAgencyID' are contained for describing an internally assigned ID. If an attribute is not explicitly assigned in the use of the CDT, it may be determined through the context.

The InternalID is used when both sender and recipient can access shared master data, e.g., during internal communication. In an SAP MDM example, a contact person is a subtype of a party and can be identified like a party using a GUID or a PartyID.

(ggg) ContactPersonPartyID

A CDT ContactPersonPartyID 9400 is an identifier for a contact person and is assigned by a party. ContactPerson is a natural person who is the contact person during the execution of business processes. ContactPerson identifies the contact person and the contact person's address. An example of CDT ContactPersonPartyID 9400 is:

<ContactPersonSellerID>4711</ContactPersonSellerID>.

The structure of CDT ContactPersonPartyID 9400 is depicted in FIG. 94. For the CDT ContactPersonPartyID 9400, the Object Class is ContactPerson 9402, the Property Qualifier term is Party 9404, the Property is Identification 9406, the Representation/Association term is Identifier 9408, the Type term is GDT 9410, the Type Name term is ContactPersonID 9412, and the Length is from one to sixty 9414. The CDT ContactPersonPartyID 9400 may be restricted 9416.

The ContactPersonPartyID is the proprietary identifier assigned by a party. The party (in its role) that assigned this identifier may be derived from the context of the message that the ContactPersonPartyID uses.

CDT ContactPersonPartyID 9400 limits the general identifier 'ContactPersonID'. In contrast to 'ContactPersonInternalID', the use of 'ContactPersonPartyID' within ContactPerson is also role-dependent (e.g., as an ID assigned by the Buyer).

The party that assigns the ID is indicated by its role. The name component 'Party' in ContactPersonPartyID is replaced with the corresponding role (e.g., ContactPersonSellerID). SchemeID and schemeVersionID may also be included as attributes if there is a need for differentiating between several schemes.

(hhh) CounterValue

A GDT CounterValue 9500 specifies a value that counts a number that changes in fixed increments. An example of GDT CounterValue 9500 is: <CounterValue>42</CounterValue>.

The structure of GDT CounterValue 9500 is depicted in FIG. 95. For the GDT CounterValue 9500, the Representation/Association Qualifier term is Counter 9502, the Representation/Association term is Value 9504, the Type term is xsd 9506, the Type Name term is nonNegativeInteger 9508, and the Length is from one to nine 9510.

GDT CounterValue 9500 is a qualified basic GDT that is based on the secondary Representation/Association Value of the CCT Numeric and a restriction of xsd:decimal. Nonnegative whole numbers less than one billion may be permitted.

GDT CounterValue 9500 may be used to count dunning notices to a debtor, orders in a queue, or telephone calls that have to be billed. GDT CounterValue 9500 can count forwards and backwards. Changes to a CounterValue may be made in steps of +1 or −1. The permitted value range can be restricted depending on how the GDT CounterValue 9500 is used.

While GDT CounterValue 9500 focuses on dynamic changes to numbers, TotalNumberValue describes a static number at a given time or for a given period. The incremental increase in a set by one element at a time, which can be counted using the CounterValue, can generate linear ordering of the elements in the set, which is reflected in the item numbers of the elements (OrdinalNumberValue).

(iii) CountryCode

The GDT CountryCode 9600 is a coded representation of a country defined by either national or administrative/political borders. An example of GDT CountryCode is:

<CountryCode>DE</CountryCode>.

The structure of GDT CountryCode 9600 is depicted in FIG. 96. For the GDT CountryCode 9600, the Property is Country 9602, the Representation/Association term is Code 9604, the Type term is CCT 9606, the Type Name term is Code 9608, and the Length is from two to three 9610. The GDT CountryCode 9600 may be restricted 9612.

GDT CountryCode 9600 may be represented using an alphabetical two-character code based on ISO 3166-1. ISO 3166-1 may be the default code list.

GDT CountryCode 9600 is used to identify a country defined by national or administrative/political borders in a physical address, or to identify a country of origin.

(jjj) CreditAgencyReportQueryReasonCode

The GDT CreditAgencyReportQueryReasonCode 9700 is the coded representation of the reason for a query to a credit agency for credit information. An example of GDT CreditAgencyReportQueryReasonCode 9700 is:

<CreditAgencyReportQueryReasonCode>01</CreditAgencyReportQueryReasonCode>.

The structure of GDT CreditAgencyReportQueryReasonCode 9700 is depicted in FIG. 97. For the GDT CreditAgencyReportQueryReasonCode 9700, the Object Class is Credit Agency Report Query 9702, the Property is Reason 9704, the Representation/Association term is Code 9706, the Type term is CCT 9708, the Type Name term is Code 9710, and the Length is two 9712.

In an example, the value range of the GDT CreditAgencyReportQueryReasonCode 9700 consists of a proprietary code list. Possible values are 01 and 02. 01 refers to a business initiation and 02 refers to an existing business connection.

(kkk) CreditAgencyReportRetrievalPermissionIndicator

A GDT CreditAgencyReportRetrievalPermissionIndicator 9800 indicates whether a party has consented to have credit information about it obtained. An example of GDT CreditAgencyReportRetrievalPermissionIndicator 9800 is:

<CreditAgencyReportRetrievalPermissionIndicator>
true</CreditAgencyReportRetrievalPermissionIndicator>

The structure of GDT CreditAgencyReportRetrievalPermissionIndicator 9800 is depicted in FIG. 98. For the GDT CreditAgencyReportRetrievalPermissionIndicator 9800, the Object Class is Credit Agency Report 9802, the Property is RetrievalPermission 9804, the Representation/Association term is Indicator 9806, the Type term is CCT 9808, the Type Name term is Indicator 9810.

GDT CreditAgencyReportRetrievalPermissionIndicator 9800 may have the value true or false. True indicates that a party has consented for credit information about it to be obtained. False indicates that a party has not consented for credit information about it to be obtained.

Obtaining credit information from a credit agency such as Dun & Bradstreet or Schufa may be performed, particularly for new business partners or for transactions with larger volumes. To comply with the legal requirements of the country concerned, explicit consent by the business partner may be required. The existence of the CreditAgencyReportRetrievalPermissionIndicator indicates whether this consent has been provided.

(lll) CreditAgencyReportScoring

A GDT CreditAgencyReportScoring 9900 is the rating of a party for credit information using a scorecard. A scorecard is a scheme used by a credit agency for assessing a party using different characteristics. Several individual characteristics are examined for each scorecard, which means that several scorecards may be needed for a comprehensive rating. This results in more scorings. An example of GDT CreditAgencyReportScoring 9900 is:

<CreditAgencyReportScoring>
<ScoreCardID>5</ScoreCardID>
<ResultValue>85</ResultValue>
<Description languageCode="EN">ScoreCard for real estate</Description>
</CreditAgencyReportScoring>.

The structure of GDT CreditAgencyReportScoring 9900 is depicted in FIG. 99. The GDT CreditAgencyReportScoring 9900 includes attributes ScoreCardId 9908, ResultValue 9926 and Description 9946. For the GDT CreditAgencyReportScoring 9900, the Object Class is CreditAgencyReport 9902, the Property is Scoring 9904, and the Representation/Association term is Details 9906.

For the ScoreCardID 9908, the Category is Attribute Element 9910, the Object Class is Credit Agency Reporting Scoring 9912, the Property is Score Card Identification 9914, the Representation/Association term is Identifier 9916, the Type term is GDT 9918, the Type Name term is ScoreCardID 9920, and the Length is from one to twenty 9922. The Cardinality is zero or one 9924.

For the ResultValue 9926, the Category is Attribute Element 9928, the Object Class is Credit Agency Report Scoring 9930, the Property is Result 9932, the Representation/Association term is Value 9934, the Type term is GDT 9936, the Type Name term is DecimalValue 9938, and the Length is maximum six predecimal digits with two decimal digits 9940. The Cardinality is one 9942. The GDT CreditAgencyReportScoring 9900 may be restricted 9944.

ScoreCardID identifies the scorecard used by the credit agency. ResultValue is the rating result calculated by the credit agency using the scorecard. Description is the description of scoring. ResultValue is unique in the context of the scorecard. The element ScoreCardID may not be required if this is already determined by the context.

(mmm) CreditCommitmentTypeCode

The GDT CreditCommitmentTypeCode 10000 is the coded representation of the type of a payment obligation (liability). An example of GDT CreditCommitmentTypeCode 10000 is:

<CreditCommitmentTypeCode>001</CreditCommitmentTypeCode>.

The structure of GDT CreditCommitmentTypeCode 10000 is depicted in FIG. 100. For the GDT CreditCommitmentTypeCode 10000, the Object Class is Credit Commitment 10002, the Property is Type 10004, the Representation/Association term is Code 10006, the Type term is CCT 10008, the Type Name term is Code 10010, and the Length is three 10012.

The value range for the GDT CreditCommitmentTypeCode 10000 may consist of a proprietary code list. Possible values are 001 through 005. 001 means liability from a sales order, 002 means liability from an accounting open item (receivable from delivery and service), 003 means liability from a special general ledger transaction (down payment, collateral), 004 means liability from a delivery, and 005 means liability from a billing document.

GDT CreditCommitmentTypeCode 10000 may be used to inform central credit management about the type of payment obligation. The GDT CreditCommitmentTypeCode 10000 may be a proprietary code list with fixed predefined values. Changes to the permitted values involve changes to the interface. This code list may correspond to the entries in table UKM_COMM_TYPE in SAP FSCM Credit Management.

(nnn) CreditRatingCode

The GDT CreditRatingCode 10100 is the coded representation of the rating of the creditworthiness of a party. An example of GDT CreditRatingCode 10100 is:

<CreditRatingCode listAgencyID="016">5A1</CreditRatingCode>.

The structure of GDT CreditRatingCode 10100 is depicted in FIG. 101. The GDT CreditRatingCode 10100 includes attributes listAgencyID 10116 and listAgencySchemeAgencyID 10134. For the GDT CreditRatingCode 10100, the Object Class is Credit 10102, the Property is Rating 10104, the Representation/Association term is Code 10106, the Type term is CCT 10108, the Type Name term is Code 10110, and the Length is from one to ten 10112. The Cardinality is one 10114.

For the listAgencyID 10116, the Category is Attribute 10118, the Object Class is Code List Agency 10120, the Property is Identification 10122, the Representation/Association term is Identifier 10124, the Type term is xsd 10126, the Type Name term is Token 10128, and the Length is from one to sixty 10130. The Cardinality is zero or one 10132.

For the listAgencySchemeAgencyID 10134, the Category is Attribute 10136, the Object Class is Code List Agency 10138, the Property is Scheme Agency 10140, the Representation/Association term is Identifier 10142, the Type term is xsd 10144, the Type Name term is Token 10146, and the Length is three 10148. The Cardinality is zero or one 10150.

The CreditRatingCode may, be a proprietary code list of a credit agency, but may also be a company's credit management code list. The individual values of the code represent a score value, for example, a ranking using German school report card grades (1="very good" through 6="unsatisfactory") or percentage points. However, there are also codes whose meaning is explained separately. Code lists that may be used for CreditRatingCode include, for example, Dun & Bradstreet Rating Code, Schufa, Bürgel, Credireform, and Mutually agreed code lists.

For Dun & Bradstreet Rating Code, the ListAgencyID is 016. For Schufa, the ListAgency ID is 344149856 and the ListAgencySchemeAgencyID is 016 For Bürgel, the ListAgency ID is the DUNS number from Bürgel and the ListAgencySchemeAgencyID is 016. For Creditreform, the ListAgency ID is 325636231 and the ListAgencySchemeAgencyID is 016. For Mutually agreed code lists, the ListAgencyID is ZZZ.

(ooo) CreditRiskClassCode

The GDT CreditRiskClassCode 10200 is the coded representation for the risk of non-payment. An example of GDT CreditRiskClassCode 10200 is: <CreditRiskClassCode listAgencyID="016">A</CreditRiskClassCode>.

The structure of GDT CreditRiskClassCode 10200 is depicted in FIG. 102. The GDT CreditRiskClassCode 10200 includes attributes listAgencyID 10216 and listAgencySchemeAgencyID 10234. For the GDT CreditRiskClassCode 10200, the Object Class is Credit 10202, the Property is RiskClass 10204, the Representation/Association term is Code 10206, the Type term is CCT 10208, the Type Name term is Code 10210, and the Length is ten 10212. The Cardinality is one 10214.

For the listAgencyID 10216, the Category is Attribute 10218, the Object Class is Code List Agency 10220, the Property is Identification 10222, the Representation/Association term is Identifier 10224, the Type term is xsd, the Type Name term is Token 10228, and the Length is from one to sixty 10230. The Cardinality is zero or one 10232.

For the listAgencySchemeAgencyID 10234, the Category is Attribute 10236, the Object Class is Code List Agency 10238, the Property is Scheme Agency 10240, the Representation/Association term is Identifier 10242, the Type term is xsd 10244, the Type Name term is Token 10246, and the Length is three 10248. The Cardinality is zero or one 10250.

The CreditRiskClassCode may be a proprietary code list of a credit agency, but may also be a company's credit management code list. The individual values of the code represent a risk class, for example, "high," "medium," or "low." However, there are also codes whose meaning is explained separately. Codes that may be used for CreditRiskClassCode include, for example, include Dun & Bradstreet Rating Code, Schufa, Bürgel, Credireform, and Mutually agreed code lists.

For Dun & Bradstreet Rating Code, the ListAgencyID is 016. For Schufa, the ListAgency ID is 344149856 and the ListAgencySchemeAgencyID is 016. For Bürgel, the ListAgency ID is the DUNS number from Bürgel and the ListAgencySchemeAgencyID is 016. For Creditreform, the ListAgency ID is 325636231 and the ListAgencySchemeAgencyID is 016. For Mutually agreed code lists, the ListAgencyID is ZZZ.

GDT CreditRiskClassCode 10200 is used to represent the risk of non-payment involved in a business transaction. The risk of non-payment refers to the party involved in the business transaction concerned.

(ppp) CreditSegmentInternalID

A GDT CreditSegmentInternalID 10300 is a proprietary identifier for a credit segment. A credit segment groups a company's business transactions from the perspective of credit assignment and control. An example of GDT CreditSegmentInternalID 10300 is <CreditSegmentInternalID>2000</CreditSegmentInternalID>

The structure of GDT CreditSegmentInternalID 10300 is depicted in FIG. 103. For the GDT Credit Segment Internal ID 10300, the Object Class is Credit Segment 10302, the Property is Internal Identification 10304, the Representation/Association term is Identifier 10306, the Type term is CCT 10308, the Type Name term is Identifier 10310, and the Length is from one to ten 10312. The GDT Credit Segment Internal ID 10300 may be restricted 10314.

In one embodiment, the credit segment ID is assigned by a company's credit manager(s). For this reason, schemeID and schemeAgencyID attributes may not be required.

A company's business transactions may be grouped into a small number of credit segments (from 1 to 5). In credit control, telecommunications companies often distinguish between the product categories such as "fixed network" and "mobile business." Other grouping criteria may be the selling organization (SellerParty) or creditor (CreditorParty).

GDT CreditSegmentInternalID 10300 is used when both sender and recipient can access shared master data.

(qqq) CreditWorthinessChangeReasonCode

The GDT CreditWorthinessChangeReasonCode 10400 is the coded representation of the reason for a change in the creditworthiness of a party. An example of GDT CreditWorthinessChangeReasonCode 10400 is:

<CreditWorthinessChangeReasonCode>CL</CreditWorthinessChangeReasonCode>.

The structure of GDT CreditWorthinessChangeReasonCode 10400 is depicted in FIG. 104. For the GDT Credit Worthiness Change Reason Code 10400, the Object Class is Credit Worthiness 10402, the Property is Change Reason 10404, the Representation/Association term is Code 10406, the Type term is CCT 10408, the Type Name term is Code 10410, and the Length is two 10412.

GDT CreditWorthinessChangeReasonCode 10400 may be represented by a proprietary code list. Possible values are 01 through 13. 01 means the creditworthiness in Credit Management was changed. 02 means the validity period of the creditworthiness in Credit Management has expired. 03 means the creditworthiness at a credit agency was changed. 04 means the validity period of the creditworthiness at a credit agency has expired. 05 means the risk class in Credit Management was changed. 06 means the credit limit was changed (manually or automatically). 07 means the validity period of the credit limit has expired. 08 means the credit limit utilization has changed. 09 means the credit limit utilization has fallen below 100%. 10 means the credit limit utilization has exceeded 100%. 11 means the credit representative has requested a change to the credit limit; this change is currently in the approval process. 12 means the rule governing the creditworthiness check that is defined in the master data of a party was changed. 13 means a negative response was received regarding the creditworthiness of a party. Changes to the permitted values require changes to the interface.

(rrr) CreditWorthinessCheckingRuleCode

The GDT CreditWorthinessCheckingRuleCode 10500 is the coded representation of the check procedure to be used to determine creditworthiness. An example of GDT CreditWorthinessCheckingRuleCode 10500 is:

<CreditWorthinessCheckingRuleCode>02</CreditWorthinessCheckingRuleCode>.

The structure of GDT CreditWorthinessCheckingRuleCode 10500 is depicted in FIG. 105. For the GDT Credit Worthiness Checking Rule Code 10500, the Object Class is Credit Worthiness 10502, the Property is Checking Rule 10504, the Representation/Association term is Code 10506, the Type term is CCT 10508, the Type Name term is Code 10510, and the Length is two 10512.

The value range of the GDT CreditWorthinessCheckingRuleCode 10500 may comprise a proprietary code list. Possible values are 01 through 04. 01 refers to a procedure for determining the creditworthiness of new business customers. 02 refers to a procedure for determining the creditworthiness of existing business customers. 03 refers to a procedure for determining the creditworthiness of new private customers. 04 refers to a procedure for determining the creditworthiness of existing private customers. Changes to the permitted values involve changes to the interface.

GDT CreditWorthinessCheckingRuleCode 10500 is used, e.g., when querying the creditworthiness of a business partner, to define the procedure for determining the score and the credit limit.

(sss) CreditWorthinessCheckingSeverityCode

The GDT CreditWorthinessCheckingSeverityCode 10600 is the coded representation of the severity of the checking procedure for determining creditworthiness. An example of GDT CreditWorthinessCheckingSeverityCode 10600 is:

<CreditWorthinessCheckingSeverityCode>3</CreditWorthinessCheckingSeverityCode>.

The structure of GDT CreditWorthinessCheckingSeverityCode 10600 is depicted in FIG. 106. For the GDT Credit Worthiness Checking Severity Code 10600, the Object Class is Credit Worthiness 10602, the Property is Checking Severity 10604, the Representation/Association term is Code 10606, the Type term is CCT 10608, the Type Name term is Code 10610, and the Length is one 10612.

The value range of the GDT CreditWorthinessCheckingSeverityCode 10600 may comprise a proprietary code list. Possible values are 1, 2 or 3. 1 refers to checks with low severity. 2 refers to checks with medium severity. 3 refers to checks with high severity. Thus, the following linear order (from low to high severity) applies for the severity of the checking procedure for determining creditworthiness: 1<2<3. Changes to the permitted values may involve changes to the interface.

The GDT CreditWorthinessCheckingSeverityCode 10600 may be used when querying the creditworthiness of a business partner, in order to define the severity of the creditworthiness check. For example, if a high severity check is to be performed for a goods issue, but a low severity check is to be performed for a bid.

(ttt) CreditWorthinessIndicator

A GDT CreditWorthinessIndicator 10700 indicates whether a party is creditworthy or not. An example of GDT CreditWorthinessIndicator 10700 is: <CreditWorthinessIndicator>true</CreditWorthinessIndicator>.

The structure of GDT CreditWorthinessIndicator 10700 is depicted in FIG. 107. For the GDT Credit Worthiness Indictor 10700, the Object Class is Currency 9302, the Property is Indicator 10704, the Representation/Association term is Indicator 10706, the Type term is CCT 10708, and the Type Name term is Indicator 10710.

GDT CreditWorthinessIndicator 10700 may have the values true or false. True indicates that a party is creditworthy. False indicates that a party is not creditworthy.

Prior to the sale, rental, or lease of a product, one may check a business partner's creditworthiness. The GDT CreditWorthinessIndicator 10700 indicates whether or not the business partner is creditworthy.

(uuu) CurrencyCode

The GDT CurrencyCode 10800 is a coded representation of the currency. An example of GDT CurrencyCode 10800 is: <PaymentCurrencyCode>EUR</PaymentCurrencyCode>.

The structure of GDT CurrencyCode 10800 is depicted in FIG. 108. For the GDT Currency Code 10800, the Object Class is Currency 10802, the Property is Code 10804, the Representation/Association term is Code 10806, the Type term is CCT 10808, the Type Name term is Code 10810, and the Length is three 10812. The GDT Currency Code 10800 may be restricted 10814.

GDT CurrencyCode 10800 represents a three-character code according to ISO 4217. GDT Amount contains a currency. However, an additional currency can be specified with GDT CurrencyCode 10800. This may be used, for example, for the specification of an alternative payment currency in the message "Payment Due Notification."

(vvv) DangerousGoods

GDT DangerousGoods 10900 are substances or objects that, due to their properties, present a danger to public safety, to the life and health of people and animals, or to the safety of things. An example of GDT DangerousGoods 10900 is:

```
< DangerousGoods >
    <ClassID>1</ ClassID >
    <SubClassID >3</SubClassID >
</ DangerousGoods >.
```

The structure of DangerousGoods is depicted in FIG. 109. The GDT DangerousGoods 10900 includes elements ID, RegulationsCode, ClassID, and DivisionID. For the GDT Dangerous Goods 10900, the Object Class is Dangerous Goods 10902 and the Representation/Association term is Details 10904.

For the ID 10906, the Category is Element 10908, the Object Class is Dangerous Goods 10910, the Property is Identification 10912, the Representation/Association term is Identifier 10914, the Type term is GDT 10916, the Type Name term is Dangerous Goods ID 10918, the Length is four 10920, and the Cardinality is zero or one 10922.

For the GDT Regulations Code 10924, the Category is Element 10926, the Object Class is Dangerous Goods 10928, the Property is Regulations 10930, the Representation/Association term is Code 10932, the Type term is GDT 10934, the Type Name term is Dangerous Goods Regulation Code 10936, the Length is from one to three 10938 and the Cardinality is zero or one 10940.

For the GDT Class ID 10942, the Category is Element 10944, the Object Class is Dangerous Goods 10946, the Property is Class 10948, the Representation/Association term is Identifier 10950, the Type term is CCT 10952, the Type Name term is Identifier 10954, the Length is from one to three 10956, and the Cardinality is zero or one 10958.

For the GDT Division ID 10960, the Category is Element 10962, the Object Class is Dangerous Goods 10964, the Property is Division 10966, the Representation/Association term is Identifier 10968, the Type term is CCT 10970, the Type Name term is Identifier 10972, the Length is from one to six 10974, and the Cardinality is zero or one 10976.

ID identifies a hazardous material using the United Nations Dangerous Goods (UNDG) Identifier. RegulationsCode is a coded representation of national or international dangerous goods rules or regulations according to the UN/EDIFACT code list 8273 "Dangerous goods regulations code." ClassID identifies a dangerous goods class, for example, class 2 (Gases). DivisionID identifies a breakdown of the dangerous goods class, for example, division 3 (Toxic Gases). The value ranges and the use of elements "ClassID" and "DivisionID" can differ from system to system and may not have a standardized norm.

If the RegulationCode is specified, ClassID may be filled in and, if necessary, DivisionID of this RegulationCode may be filled in. In one embodiment, dangerous goods rules or regulations can be used that have a maximum of a two steps in their classification scheme. The information DangerousGoods may be a requirement for an appropriate and environmentally-friendly handling, transport, and storage of a product, that is or contains a dangerous good.

GDT DangerousGoods 10900 can be used with the GDT DangerousGoodsIndicator 10900 in that the GDT DangerousGoodsIndicator 10900 displays that dangerous goods are contained in a delivery, while the GDT DangerousGoods 10900 provides more detail about the danger posed by a delivery item. "Dangerous Goods" is the usual name for dangerous goods/materials at national and international level. In the USA, however, the term "Hazardous Materials" is also common. The terms "Dangerous Goods" and "Hazardous Materials" and variants of these two are not used to differentiate between the transport of dangerous goods and the storage of dangerous goods.

(www) DangerousGoodsID

A GDT DangerousGoodsID 11000 is the unique identifier for a dangerous good, using the United Nations Dangerous Goods (UNDG) Number. An example of GDT DangerousGoodsID 11000 is: <DangerousGoodsID>2453</DangerousGoodsID>.

The structure of GDT DangerousGoodsID 11000 is depicted in FIG. 110. For the GDT Dangerous Goods ID 11000, the Object Class is Dangerous Goods 11002, the Property is Identification 11004, the Representation/Association term is Identifier 11006, the Type term is CCT 11008, the Type Name term is Identifier 11010 and the Length is four 11012.

(xxx) DangerousGoodsIndicator

A GDT DangerousGoodsIndicator 11100 indicates whether dangerous goods are contained in a combination of products or not. An example of GDT DangerousGoodsIndicator 11100 is: <DangerousGoodsIndicator>true</DangerousGoodsIndicator>.

The structure of GDT DangerousGoodsIndicator 11100 is depicted in FIG. 111. For the GDT Dangerous Goods Indicator 11100, the Object Class is Dangerous Goods 11102, the Property is Indicator 11104, the Representation/Association term is Indicator 11106, the Type term is CCT 11108, the Type Name term is Indicator 11110, the Length is one 11112, and the Cardinality is zero or one 11114.

GDT DangerousGoodsIndicator 11100 may have the values true or false. True indicates that a combination of products contains dangerous goods. False indicates that a combination of products contains no dangerous goods.

If the indicator is set, the stipulations for the corresponding dangerous good are valid for the combination. These stipulations may be determined by analyzing the message using the GDT DangerousGoods 11100.

GDT DangerousGoodsIndicator 11100 may be used with the GDT DangerousGoods in that the GDT DangerousGoodsIndicator 11100 displays that dangerous goods are contained in a combination, and the GDT DangerousGoods provides more detail about the danger posed by a delivery item.

(yyy) DangerousGoodsRegulationsCode

The GDT DangerousGoodsRegulationsCode 11200 is the coded representation of a national or international dangerous goods rules or regulations according to the UN/EDIFACT code list 8273 "Dangerous goods regulations code" An example of GDT DangerousGoodsRegulationsCode 11200 is:

<DangerousGoodsRegulationsCode>GVS</DangerousGoodsRegulationsCode>.

The structure of GDT DangerousGoodsRegulationsCode 11200 is depicted in FIG. 112. For the GDT Dangerous Goods Regulation Code 11200, the Object Class is Dangerous Goods 11202, the Property is Regulations 11204, the Representation/Association term is Code 11206, the Type term is CCT 11208, the Type Name is Code 11210 and the Length is from one to three 11212.

In an embodiment, the possible values for GDT DangerousGoodsRegulationsCode 11200 are described in the UN/EDIFACT code list 8273 "Dangerous goods regulations code." These include ADR, ADS, ADT, ADU, AGS, ANR, ARD, CFR, COM, GVE, GVS, ICA, IMD, RGE, RID, UI, and ZZZ.

(zzz) Date

A GDT Date 11300 is the specification of an exact day in the Gregorian calendar. An example of GDT Date 11300 is: <OrderDate>2002-04-19</OrderDate>.

The structure of GDT Date 11300 is depicted in FIG. 113. For the GDT Date 11300, the Property is Date 11302, the Representation/Association term is Date 11304, the Type term is CCT 11306, and the Type Name term is Date 11308.

The GDT Date 11300 uses the W3C built-in data type xsd:date. This is structured according to the extended representation of ISO 8601.

The extended representation of Date is CCYY-MM-DD, for example, 2002-04-19. The extended representation uses the literals CC for century, YY for year, MM for month, and DD for day. There may also be a hyphen between the year, month, and day.

In an embodiment, years are represented by a four-character code and the years 0001 to 9999 are supported. Leading positive or negative signs before the year are not supported. Time zones prefixed with the time-zone-character "Z" may not be supported for the date.

GDT Date 11300 is used to represent points in time or time stamps in which the day may be exact.

(aaaa) DatePeriod

A GDT DatePeriod 11400 is a period that is defined by two points in time. These points in time are expressed in calendar days. This time period is determined by a start time and an end time, a start time with a duration, or a duration with an end time. An example of GDT DatePeriod 11400 is:

```
<HolidayPeriod>
    <StartDate>2003-07-01</StartDate>
    <EndDate>2003-10-25</EndDate>
</HolidayPeriod>.
```

The structure of GDT DatePeriod 11400 is depicted in FIG. 114. The GDT DatePeriod 11400 includes elements StartDate, EndDate, and Duration. For the GDT Date Period 11400, the Object Class is Date Period 11402 and the Property is Details 11404.

For the GDT Start Date 11406, the Category is Element 11408, the Object Class is Time Period 11410, the Property is Start Date 11412, the Representation/Association term is Date 11414, the Type term is GDT 11416, the Type Name term is Date 11418, and the Cardinality is zero or one 11420.

For the GDT End Date 11422, the Category is Element 11424, the Object Class is Date Period 11426, the Property is End Date 11428, the Representation/Association term is Date 11430, the Type term is GDT 11432, the Type Name term is Date 11434, and the Cardinality is zero or one 11436.

For the GDT Duration 11438, the Category is Element 11440, the Object Class is Date Period 11442, the Property is Duration 11444, the Representation/Association term is Duration 11446, the Type term is GDT 11448, the Type Name term is Duration 11450, and the Cardinality is zero or one 11452.

GDT DatePeriod 11400 is an aggregation and includes the sub-elements StartDate, EndDate, and Duration. StartDate represents the start date in the time unit based on the extended representation of ISO 8601. EndDate represents the end date in the time unit based on the extended representation of ISO 8601. Duration represents the relative duration based on convention ISO 8601. The following conventions may be used: years (nY), months (nM) and days (nD), hours (nH), minutes (nM) and seconds (n.nnnS). One example of Duration is <Duration>P1H7M9T</Duration>

The sub-elements in GDT DatePeriod 11400 are optional. However, the representation can include one of the following tuples: StartDate and EndDate, StartDate and Duration, or EndDate and Duration. EndDate may be greater than or equal to the StartDate. For example, <StartDate>2003-07-01</StartDate>, <EndDate>2003-10-25</EndDate>.

Period can be used to specify a time period that can be expressed using two predefined dates or one date and one relative duration. This period may be the start and end dates of a holiday or the start date and duration in days of a temporary work contract.

The time of day is not specified in GDT DatePeriod 11400. For this reason, two business partners may agree unambiguously when a date period begins and when it ends. For example, it can begin at 00:00:00 and end at 23:59:59. The term "Date" in the "Object Class" of the CDT is redundant. Therefore, it comprises the term "Period." This is because the term "Date" is given by the "Property" of the sub-elements. As a result, the semantic of this CDT is unique.

(bbbb) DateTime

A GDT DateTime 11500 is the specification of an accurate-to-the-second time stamp of a calendar day. An example of GDT DateTime 11500 is: <ConstructionDateTime>2002-04-19T15:30:00+01:00 </ConstructionDateTime>.

The structure of GDT DateTime 11500 is depicted in FIG. 115. For GDT Date Time 11500, the Property is Date Time 11502, the Representation/Association term is Date Time 11504, the Type term is CCT 11506, the Type Name term is Date Time 11508.

The GDT DateTime 11500 core component may be based on the W3C "built-in datatype" xsd:dateTime. This is structured according to the extended representation of ISO 8601. The extended representation is CCYY-MM-DDThh:mm:ss(.sss)Z or CCYY-MM-DDThh:mm:ss(.sss)(+/−)hh:mm (for example, 2002-04-19T15:30:00Z or 2002-04-19T10:30:00+05:00, respectively).

The extended representation uses the literals CC for century (00-99), YY for year (00-99), MM for month (01-12), and DD for day (01-28 in month 02; 01-29 in month 02 when the year is a leap year; 01-30 for months 04, 06, 09, and 11; 01-31 for months 01, 03, 05, 07, 08, 10, and 12), hh for hours (00-23), mm for minutes (00-59), ss for seconds (00-59), and .sss for fractions of a second (up to three decimal places after the decimal). In addition, there may be a hyphen between the year, month, and day. A separator "T" may be used between the date and time. Z specifies when the time represented is also UTC time. Also, +hh:mm specifies when the represented time is a local time that is ahead of UTC time, and −hh:mm specifies when the represented time is a local time that is behind UTC time.

The time stamp can be specified without the additional specifications (Z, +hh:mm, −hh:mm) relating to the coordinated world time (UTC time). In an embodiment, this time stamp is not converted to the respective local time and is therefore for information purposes.

The following value ranges are defined for DateTime: Day represents all dates from the Gregorian calendar, Time represents exactly 24 hours (0-23), Minutes represents exactly 60 minutes (0-59), Seconds represents exactly 60 seconds (0-59), and Time may be expressed in UTC.

Years are represented by a four-character code (0001 to 9999). In an embodiment, leading positive or negative signs before the year are not supported. According to these constraints, the regular expression restricts the character pattern of date and time to the following:

[0-9]{4}-[0-9]{2}-[0-9]{2}T[0-9]{2}[0-9]{2}:[0-9]{2}[0-9]{2}:[0-9]{2}[0-9]{2}(.[0-9]*)?([Z+−][0-9]{2}[0-9]{2}:[0-9]{2}[0-9]{2})? Nevertheless, meaningless data such as 0000-00-00T00:00Z can be represented by this regular expression. However, explicit restrictions mean that this is not possible for the built-in data type "xsd:dateTime".

GDT DateTime 11500 is used for exact time stamps that contain the day and time. For example, creation date/time, receipt date/time, processing date/time, delivery date/time, expiry date/time, and the like.

The primary representation term for the CCT "DateTime" is DateTime. Additional secondary representation terms are Date, which represents a calendar value for a single day and has a built-in data type xsd:date and a length of 10, and Time, which represents a to-the-second time value and has a built-in data type xsd:time.

In the case of a business transaction, DateTime may arise in a specific business role. In the element name, these roles are placed in front of the term "DateTime", whereby additional context-specific qualifiers may also be added. For example, PlannedArrivalDateTime is a date/time of a planned arrival.

Times that are relevant in logistics execution are described in their logistical sequence in the table below. Further roles of DateTime are also described in alphabetical order.

| DateTime Role | English Name | Definition |
|---|---|---|
| PositioningDateTime | Material availability date/time | Date/time at which goods are made available for packing and picking. |
| IssueDateTime | Issue date/time | Date/time at which something is issued. |
| PickingDateTime | Picking date/time | Date/time at which goods are picked. |
| PackingDateTime | Packing date/time | Date/time at which goods are packed. |
| CarrierHandoverDateTime | Date/time of handover to the carrier | Date/time at which something is handed over to the carrier. |
| PickupDateTime | Pickup date/time | Date/time at which goods are picked up. |
| LoadingDateTime | Loading date/time | Date/time at which goods are loaded. |
| YardDepartureDateTime | Date/time when something leaves the yard | Date/time of departure of a closed area outside the warehouse in which vehicles are loaded and unloaded. |
| ArrivalDateTime | Arrival date/time | Date/time at which something arrives. |
| DeliveryDateTime | Delivery date/time | Date/time at which a delivery takes place. |
| ReceiptDateTime | Receipt date/time | Date/time at which something is received. |
| YardArrivalDateTime | Date/time of arrival in the yard | Date/time of arrival in a closed area outside the warehouse in which vehicles are loaded and unloaded. |
| UnloadingDateTime | Unloading date/time | Date/time at which goods are unloaded. |
| UnpackingDateTime | Unpacking date/time | Date/time at which goods are unpacked. |
| PutawayDateTime | Putaway date/time | Date/time at which goods are put away. |
| AvailabilityDateTime | Availability date/time | Date/time at which something is available. |
| AdvertisementDateTime | Advertisement date/time | Date/time at which something is advertised. |
| ChangeDateTime | Change date/time | Date/time at which something is changed. |
| CreationDateTime | Creation date/time | Date/time at which something is created. |
| ExecutionDateTime | Execution date/time | Date/time at which something is executed. |
| OrderingDateTime | Ordering date/time | Date/time at which an order is expected or takes place. |

-continued

| DateTime Role | English Name | Definition |
|---|---|---|
| PlannedDateTime | Planned date/time | Date/time for which something is planned. |
| ValidityDateTime | Validity date/time | Date/time at which something is valid. |

The coordinated world time or coordinated universal time (UTC) is the standardized basis for time specifications that are used internationally. It is based on solar time and is an extremely constant time unit. The mean solar time at the Greenwich meridian can be taken as an approximate guide value for UTC. UTC replaced Greenwich Mean Time (GMT) in 1972 as it was more accurate.

The Gregorian calendar is used predominantly in the western world today and is an approximation of the complicated calculation of a tropical year. The length of a mean tropical year is 365.2422 days. The Gregorian calendar determines the rules for leap years and was introduced in 1582.

(cccc) DateTimePeriod

A GDT DateTimePeriod 11600 is a period that is defined by two points in time. These points in time are expressed by time stamps, accurate to the second, together with calendar days. The time period is determined by a start time and an end time, a start time with a duration, or a duration with an end time. An example of GDT DateTimePeriod 11600 is:

```
<ContractValidityPeriod>
    <StartDateTime>2003-03-01T12:00:00</StartDateTime>
    <EndDateTime>2005-06-15T12:00:00</EndDateTime>
</ContractValidityPeriod>.
```

The structure of GDT DateTimePeriod 11600 is depicted in FIG. 116. The GDT DateTimePeriod 11600 includes elements StartDateTime 11606, EndDateTime 11622, and Duration 11638. For GDT Date Time Period 11600, the Object Class is Date Time Period 11602, and the Property is Details 11604.

For GDT Start Date Time 11606, the Category is Element 11608, the Object Class is Date Time Period 11610, the Property term is Start Date Time 11612, the Representation/Association term is Date Time 11614, the Type term is GDT 11616, the Type Name term is Date Time 11618, and the Cardinality is zero or one 11620.

For GDT End Date Time 11622, the Category is Element 11624, the Object Class is Date Time Period 11626, the Property term is End Date Time 11628, the Representation/Association term is Date Time 11630, the Type term is GDT 11632, the Type Name term is Date Time 11634, and the Cardinality is zero or one 11636.

For GDT Duration 11638, the Category is Element 11640, the Object Class is Date Time Period 11642, the Property term is Duration 11644, the Representation/Association term is Duration 11646, the Type term is GDT 11648, the Type Name term is Duration 11650, and the Cardinality is zero or one 11652.

GDT DateTimePeriod 11600 is an aggregation and includes the sub-elements StartDateTime, EndDateTime, and Duration. StartDateTime represents the accurate-to-the-second start time on a calendar day based on the extended representation ISO 8601. EndDateTime represents the accurate-to-the-second end time on a calendar day based on the extended representation ISO 8601.

Duration represents the relative duration based on convention ISO 8601. Other representation conventions for year (nY), month (nM), and day (nD) can be used. One example of duration is <Duration>P1H7M9T12H10M13.3S</Duration>.

The sub-elements in GDT DateTimePeriod 11600 are optional. However, the representation can include one of the following date sets: StartDateTime and EndDateTime, StartDateTime and Duration, and EndDateTime and Duration.

The time stamp (EndDateTime) may be greater than or equal to the start time stamp (StartDateTime) (both accurate to the second). For example, <StartDateTime>2003-03-01T12:00:00</StartDateTime>, <EndDateTime>2005-06-15T18:30:00</EndDateTime> or <StartDateTime>2003-03-01T12:00:00</StartDateTime>, <EndDateTime>2005-03-01T12:00:00</EndDateTime>.

Period can be used to specify a time period and can be expressed using two time stamps (both accurate to the second) or one accurate-to-the-second time stamp and one relative duration. This period might be the validity of a contract, which is expressed by a start and end time.

In the case of a business transaction, DateTimePeriod arises in a specific business role. In the element name, these roles are placed in front of the term Period, whereby additional context-specific qualifiers could also be added, for example, PlannedArrivalPeriod is a period of a planned arrival.

The logistical sequence or the overlapping time periods, which may be relevant in logistical execution, are described in this sequence in the table below. Further roles of DateTimePeriod are then shown in alphabetical order.

| Period Role | English Name | Definition |
|---|---|---|
| TransportPlanningPeriod | Transportation planning period | Period in which transportation planning takes place. |
| PositioningPeriod | Material availability period | Period in which goods are made available for packing and picking. |
| IssuePeriod | Issue period | Period in which something is issued. |
| PickingPeriod | Picking period | Period in which goods are picked. |
| PackingPeriod | Packing period | Period in which goods are packed. |
| CarrierHandoverPeriod | Period for handover to the carrier | Period in which something is handed over to the carrier. |
| PickupPeriod | Pickup period | Period in which goods are picked up. |

-continued

| Period Role | English Name | Definition |
|---|---|---|
| LoadingPeriod | Loading period | Period in which goods are loaded. |
| YardDeparturePeriod | Period when something leaves the yard | Period of departure of a closed area outside the warehouse in which vehicles are loaded and unloaded. |
| ShippingPeriod | Shipping period | Period in which goods are shipped (between ship-from location, ship-to location, and possibly transshipment location). |
| ArrivalPeriod | Arrival period | Period in which something arrives. |
| DeliveryPeriod | Delivery period | Period in which a delivery takes place. |
| ReceiptPeriod | Receipt period | Period in which something is received. |
| YardArrivalPeriod | Period of arrival in the yard | Period of arrival in a closed area outside the warehouse in which vehicles are loaded and unloaded. |
| UnloadingPeriod | Unloading period | Period in which goods are unloaded. |
| UnpackingPeriod | Unpacking period | Period in which goods are unpacked. |
| PutawayPeriod | Putaway period | Period in which goods are put away. |
| AvailabilityPeriod | Availability period | Period in which something is available. |
| AdvertisementPeriod | Advertisement period | Period in which something is advertised. |
| ExecutionPeriod | Execution period | Period in which something is executed. |
| OrderingPeriod | Ordering period | Period in which an order is expected/takes place. |
| PlannedPeriod | Planned period | Period for which something is planned. |
| PlanningPeriod | Planning period | Period in which something is planned. |
| ValidityPeriod | Validity period | Period in which something is valid. |

TransportPlanningPeriod can include PositioningPeriod, PickingPeriod, and PackingPeriod. IssuePeriod can include PickingPeriod, PackingPeriod, LoadingPeriod, and YardDeparturePeriod. PickupPeriod can include LoadingPeriod and YardDeparturePeriod. CarrierHandoverPeriod can include LoadingPeriod, YardDeparturePeriod, and ShippingPeriod. DeliveryPeriod, ArrivalPeriod, and ReceiptPeriod can include YardArrivalPeriod, UnloadingPeriod, UnpackingPeriod, and PutawayPeriod.

The term DateTime in Object Class Term may be obsolete in GDTs. Therefore, this term comprises Period. This is because the term DateTime is given by the sub-elements using Property Term. As a result, the semantic of these GDTs may be unique.

(dddd) DecimalValue

A GDT DecimalValue 11700 is a numeric value represented as a decimal. An example of GDT DecimalValue 11700 is:

```
<PropertyValue>
    <DecimalValue>3.14159</DecimalValue>
</PropertyValue>.
```

The structure of GDT DecimalValue 11700 is depicted in FIG. 117. For the GDT Decimal Value 11700, the Representation/Association Qualifier term is Decimal 11702, the Representation/Association term is Value 11704, the Type term is xsd 11706, and the Type 20 Name term is Decimal 11708.

GDT DecimalValue 11700 is a qualified basic GDT that is based on the secondary Representation/Association Value of the CCT Numeric. GDT DecimalValue 11700 is used if the reference to the decimal representation of the element based on GDT DecimalValue 11700 is both meaningful and desired from a semantic perspective. This is the case with mathematical/scientific and technical numeric values. The Decimal qualifier then forms part of the relevant element name.

Numeric business values may not be defined using their decimal representation; rather, this representation is derived implicitly from the semantics of the numeric value. Examples of this include Price or ExchangeRate. In this case, GDT DecimalValue 11700 is not used.

(eeee) DeletedIndicator

A GDT DeletedIndicator 11800 indicates whether an object has been logically deleted or not. An example of GDT DeletedIndicator 11800 is:

<DeletedIndicator>false</DeletedIndicator>.

The structure of GDT DeletedIndicator 11800 is depicted in FIG. 118. For the GDT Deleted Indicator 11800, the Property is Deleted Indicator 11802, the Representation/Association term is Indicator 11804, the Type term is CCT 11806, and the Type Name term is Indicator 11808.

The GDT DeletedIndicator 11800 can have the values true or false. True indicates that the object has been logically deleted. False indicates that the object has not been logically deleted.

In the context of an interface, there may be a description of which object the GDT DeletedIndicator 11800 refers to, its business meaning, and whether a set DeletedIndicator can be canceled in a subsequent message.

(ffff) DeliveryScheduleTypeCode

The GDT DeliveryScheduleTypeCode 11900 is a coded representation of the type of a delivery schedule. This type describes the (business) character of a delivery schedule and defines its fundamental properties. An example of GDT DeliveryScheduleTypeCode 11900 is:

```
<DeliverySchedule>
    <ID>4711</ID>
    <TypeCode>2</TypeCode>
    ...
</DeliverySchedule>.
```

The structure of GDT DeliveryScheduleTypeCode 11900 is depicted in FIG. 119. For GDT Delivery Schedule Type Code 11900, the Object Class is Delivery Schedule 11902, the Property is Type 11904, the Representation/Association term is Code 11906, the Type term is CCT 11908, the Type Name term is Code 11910, and the Length is one 11912.

The value ranges of the GDT DeliveryScheduleTypeCode 11900 may consist of a proprietary code list. Possible values are 1 or 2. 1 refers to a delivery schedule for the short-, medium- and/or long-term area on the basis of daily, weekly and/or monthly time specifications. 2 refers to a delivery schedule for just-in-time deliveries on the basis of time specifications throughout the day, if necessary, in terms of minutes.

The GDT DeliveryScheduleTypeCode 11900 is used within the scheduling-agreement-based release ordering to communicate the business character of a delivery schedule to a vendor. It may be used, for example, in the automotive industry.

(gggg) DeliveryTerms

The GDT DeliveryTerms 12000 summarizes conditions and agreements formulated at the time of the order that apply for the execution of the delivery and transport of ordered goods and the associated services and activities. An example of GDT DeliveryTerms 12000 is:

```
<DeliveryTerms>
    <DeliveryItemGroupID>123</DeliveryItemGroupID>
    <DeliveryPriorityCode>1</DeliveryPriorityCode>
    <Incoterms>
        <ClassificationCode listID="Incoterms" listVer-
sionID="2000"
listAgencyID="4"> FOB
        </ClassificationCode >
        <TransferLocationName langCode="de"> Hamburg
</TransferLocationName>
    </Incoterms>
    <PartialDelivery>
        <MaximalNumber>9</MaximalNumber>
    </PartialDelivery>
    <QuantityTolerance>
        <OverPercent>33.0</OverPercent>
        <UnderPercent>1.0</UnderPercent>
    </QuantityTolerance>
    <MaximumLeadTimeDuration> P2M5D
    </MaximumLeadTimeDuration>
    <Transport>
        <ServiceLevelCode listID="DE 4219"
listVersionID="D.02B"
listAgencyID="6"> 1 </ ServiceLevelCode>
        <ModeCode listID="DE 8067" listVersionID="D.02B"
listAgencyID="6"> 1 </ ModeCode>
        <MeansDescriptionCode listID="DE 8179"
listVersionID="D.02B" listAgencyID="6"> 4
        </MeansDescriptionCode>
    <Transport>
    <Description langCode="de">
        This is a German description text.
    </Description>
</DeliveryTerms >.
```

In the above example, ListAgencyID="4" describes "ICC/WBO", ListAgencyID="6" describes "UN/ECE", listVersionID="D.02B" describes UN/EDIFACT standard directory Year 2002, Version B, listID="DE 4219" describes UN/EDIFACT "Transport Service Priority Code", listID="DE 8067" describes UN/EDIFACT "Transport Mode Name Code", listID="DE 8179" describes UN/EDIFACT "Transport Means Description Code", and MaximumLeadTimeDuration=P2M5D describes a duration of 2 months 5 days.

The structure of GDT DeliveryTerms 12000 is depicted in FIG. 120. For GDT Delivery Terms 12000, the Object Class is Delivery Terms 12002 and the Representation/Association term is Details 12004.

For GDT Delivery Item Group ID 12006, the Category is Element 12008, the Object Class is Delivery Terms 12010, the Property is Order Item Group Identification 12012, the Representation/Association term is Identifier 12014, the Type term is GDT 12012, the Type Name term is Business Transaction Document Item Group ID 12014, and the Cardinality is zero or one 12016.

For GDT Delivery Priority Code 12018, the Category is Element 12020, the Object Class is Delivery Terms 12022, the Property is Delivery Priority Code 12024, the Representation/Association term is Code 12026, the Type term is GDT 12028, the Type Name term is Business Transaction Priority Code 12030 and the Cardinality is zero or one 12032.

For GDT Incoterms 12034, the Category is Element 12036, the Object Class is Delivery Terms 12038, the Property is Incoterms 12042, the Representation/Association term is Incoterms 12042, the Type term is GDT 12044, the Type Name term is Incoterms 12046 and the Cardinality is zero or one 12048.

For GDT Partial Delivery 12050, the Category is Element 12052, the Object Class is Delivery Terms 12054, the Property is Partial Delivery 12056, the Representation/Association term is Partial Delivery 12058, the Type term is GDT 12060, the Type Name term is Partial Delivery 12062, and the Cardinality is zero or one 12064.

For GDT Quantity Tolerance 12066, the Category is Element 12068, the Object Class is Delivery Terms 12070, the Property is Quantity Tolerance 12072, the Representation/Association term is Quantity Tolerance 12074, the Type term is GDT 12076, the Type Name term is Quantity Tolerance 12078, and the Cardinality is zero or one 12080.

For GDT Maximum Lead Time Duration 12082, the Category is Element 12084, the Object Class is Delivery Terms 12086, the Property is Maximum Lead Time 12088, the Representation/Association term is Duration 12090, the Type term is GDT 12092, the Type Name term is Duration 12094, and the Cardinality is zero or one 12096.

For GDT Transport 12098, the Category is Element 12099, the Object Class is Delivery Terms 12001A, the Property is Transport 12002A, the Representation/Association term is Details 12003A, and the Cardinality is zero or one 12004A.

For GDT Service Level Code 12005A, the Category is Element 12006A, the Object Class is Transport 12007A, the Property is Service Level Code 12008A, the Representation/Association term is Code 12009A, the Type term is GDT 12010A, the Type Name term is Transport Service Level Code 12011A, and the Cardinality is zero or one 12012A.

For GDT Mode Code 12013A, the Category is Element 12014A, the Object Class is Transport 12015A, the Property is Mode Code 12016A, the Representation/Association term is Code 12017A, the Type term is GDT 12018A, the Type Name term is Transport Mode Code 12019A, and the Cardinality is zero or one 12020A.

For GDT Means Description Code 12021A, the Category is Element 12022A, the Object Class is Transport 12023A, the Property is Means Description Code 12024A, the Representation/Association term is Code 12025A, the Type term is GDT 12026A, the Type Name term is Transport Means Description Code 12027A, and the Cardinality is zero or one 12028A.

For GDT Description 12029A, the Category is Element 12030A, the Object Class is Delivery Terms 12031 A, the Property is Description 12032A, the Representation/Association term is Description 12033A, the Type term is GDT 12034A, the Type Name term is Description 12035A, and the Cardinality is zero or one 12036A.

DeliveryItemGroupID is a unique identifier for a group of items to be delivered together. DeliveryPriorityCode is a priority/urgency of the delivery/delivery item according to the requirements of the buyer. Incoterms is a standard contract formula for the terms of delivery. PartialDelivery is the maximum number of partial deliveries that may/can be carried out to deliver the ordered quantity of an item. QuantityTolerance is the tolerated difference between a requested quantity and an actual quantity.

MaximumLeadTimeDuration is the maximum lead time from the time of the order to the receipt of the delivery. This duration can be specified in a contract award or can be agreed upon in a supply contract and defines the binding basis for calculating the latest possible received delivery date for a given order date.

Transport: ServiceLevelCode is in terms of delivery of goods, agreed/defined services concerning the speed of the delivery. Transport: ModeCode describes how the delivery is to be made and the transportation mode to be used for the delivery, but may not define a specific route or means of transport. Transport: MeansDescriptionCode is the means of transport category to be used to move goods or persons. Description is the natural readable text for providing additional information about a delivery/delivery item.

GDT DeliveryTerms 12000 contain detailed information on the agreed delivery conditions (Incoterms), delivery modalities (accepted number of partial deliveries, delivery priority, grouping requests for deliveries, tolerances for quantity deviations) and transport modalities (such as shipping/transport type and means of transport to be used). Moreover, additional information can be specified as freeform text. Specifying an element of the structure may be optional.

Using the information in GDT DeliveryTerms 12000, the involved business partners (buyer and seller) agree on outline conditions for purchase orders regarding the delivery and transportation of the ordered products/goods. They determine and influence the flow of the subsequent logistical processes.

GDT DeliveryTerms 12000 are used at header and item level. A specification at item level overwrites the corresponding specification at header level.

(hhhh) Description

A GDT Description 12100 is natural-language text. An example of GDT Description 12100 is:

```
<OrderDescription langCode="en">
    A character string with a specified language.
</OrderDescription>.
```

The structure of GDT Description 12100 is depicted in FIG. 121. For GDT Description 12100, the Object Class is Description 12102, the Representation/Association term is Text 12104, the Type term is CCT 12106, the Type Name term is Text 12108. The GDT Description 12100 may be restricted 12110.

GDT Description 12100 contains an attribute "languageCode" for determining the appropriate language of the element content. The language code is based on RFC 3066. For GDT Language Code 12112, the Category is A 12114, the Object Class is Description 12116, the Property is Language Code 12118, the Representation/Association term is Code 12120, the Type term is xsd 12122, the Type Name term is Language 12124, and the Cardinality is one 12126.

GDT Description 12100 may be used for handling information, readable additional information on the structured information, or descriptions of services and products.

The character length of GDT Description 12100 may not defined and would therefore be system-dependent. In an embodiment, GDT Description 12100 may not be used for transmitting proprietary control information, coded and mutually agreed on values, detailed descriptions of values that could otherwise be represented as coded values or identifiers, or numerical values.

(iiii) DigitNumberValue

A GDT DigitNumberValue 12200 is the number of digits used to represent a real value or whole number. An example of GDT DigitNumberValue 12200 is:

<DigitNumberValue>7</DigitNumberValue>.

The structure of GDT DigitNumberValue 12200 is depicted in FIG. 122. For GDT Digit Number Value 12200, the Representation/Association Qualifier term is Digit Number 12202, the Representation/Association term is Value 12204, the Type term is xsd 12206, the Type Name term is non Negative Integer 12208, and the Length is from one to two 12210.

GDT DigitNumberValue 12200 is a qualified basic GDT based on the secondary Representation/Association Value of the CCT Numeric and a restriction of xsd:decimal. Non-negative whole numbers less than one hundred may be permitted.

GDT DigitNumberValue 12200 may be used to describe the format for representing decimal values (e.g., total number of digits, number of decimal places) or floating point numbers (e.g., mantissa length).

(jjjj) DirectMaterialIndicator

A GDT DirectMaterialIndicator 12300 indicates whether a material is used as a direct material in the context of a process or not. A direct material is a product of the type "material" that is used directly in the production of products and that affects the value of the finished product in terms of manufacturing costs. An example of DirectMaterialIndicator is:

<DirectMaterialIndicator>true</DirectMaterialIndicator>.

The structure of GDT DirectMaterialIndicator 12300 is depicted in FIG. 123. For GDT Direct Material Indicator 12300, the Property is Direct Material Indicator 12302, the Representation/Association term is Indicator 12304, the Type term is CCT 12306 and the Type Name term is Indicator 12308.

The GDT DirectMaterialIndicator 12300 can have the values true or false. True indicates that a material is used as a direct material in the context of a process. False indicates that a material is not used as a direct material in the context of a process. The GDT DirectMaterialIndicator 12300 is to be used for products of type "material."

The GDT DirectMaterialIndicator 12300 may be used to indicate whether a material or material type listed in a purchase order item is used as a direct material in the context of a process. In an embodiment, the DirectMaterialIndicator is not an attribute of a material. A material can be treated as a direct material in some processes and not in others.

The context to which the DirectMaterialIndicator refers may be identified from the usage of the GDT.

(kkkk) DunningCounterValue

A GDT DunningCounterValue 12400 is the number of dunning notices sent. An example of GDT DunningCounterValue 12400 is: <DunningCounterValue>2</DunningCounterValue>.

The structure of GDT DunningCounterValue 12400 is depicted in FIG. 124. For GDT Dunning Counter Value 12400, the Object Class is Dunning 12402, the Property is Counter 12404, the Representation/Association term is Value 12406, the Type term is GDT 12408 and the Type Name term is Counter Value 12410.

In an embodiment, non-negative, whole number values are permitted for GDT DunningCounterValue 12400.

GDT DunningCounterValue 12400 specifies the number of dunning notices that have been sent to one or more business partners in a specified period with regard to one or more receivables. In a company, for example, this information is sent from Current Account Accounting to Credit Management.

Several dunning notices can exist for a receivable. These dunning notices are also grouped by dunning level (DunningLevelValue). However, the dunning level does not have to increase automatically each time a dunning notice is sent.

(llll) DunningLevelValue

A GDT DunningLevelValue 12500 is the level of intensity with which a party is urged to pay existing receivables. An example of GDT DunningLevelValue 12500 is:

<DunningLevelValue>4</DunningLevelValue>.

The structure of GDT DunningLevelValue 12500 is depicted in FIG. 125. For GDT Dunning Level Value 12500, the Object Class is Dunning 12502, the Property is Level 12504, the Representation/Association term is Value 12506, the Type term is CCT 12508, the Type Name term is Numeric 12510, and the Length is one 12512.

Non-negative, whole number values from 0 to a maximum value may be permitted for GDT DunningLevelValue 12500. Also, the maximum value may not exceed 9. For the dunning level, the following linear order applies: 0<1<2< . . . <maximum value.

The GDT DunningLevelValue 12500 conveys the relative intensity of a dunning notice based on a linear integer scale between zero and a specified maximum value.

Dunning is a process for contacting customers to collect unpaid bills. It generally starts at the first level with a payment reminder and progresses to dunning notices and even threats as payments become more overdue. Overall, dunning levels are first regulated and prescribed by country-specific laws. Within the scope of the statutory regulations, however, a dunning company can also define several additional dunning levels that differ in the form of the dunning notice, e.g., a friendly payment reminder at level 1 and a more abrupt payment reminder at level 2.

The GDT DunningLevelValue 12500 may not define a DunningLevelCode that is then used to define the semantics of individual dunning levels. Since these semantics can differ from country to country and company to company, a DunningLevelCode can be defined using additional attributes such as schemeAgencyID. In contrast, the use of the GDT DunningLevelValue 12500 presupposes that the semantic of a conveyed dunning level is either known to the sender and recipient or is not relevant in the given context.

(mmmm) Duration

A GDT Duration 12600 is a period of time of a particular length without a fixed start or end time. This period of time is expressed in years, months, days, hours, minutes, seconds, and fractions of a second. An example of GDT Duration 12600 is:

<TravelDuration>PT23H12M</TravelDuration>.

The structure of GDT Duration 12600 is depicted in FIG. 126. For GDT Duration 12600, the Property is Duration 12602, the Representation/Association term is Date Time 12604, the Type term is xsd 12606, and the Type Name term is Duration 12608.

GDT Duration 12600 is based on the "built-in data type" of W3C xsd:duration. This is structured according to the extended representation of ISO 8601. The representation of GDT Duration 12600 is PnYnMnDTnHnMnS, for example, P12Y12M2DT4H12M40S. The representation uses the literals P for the duration and may precede every duration value, nY for duration in years, nM for the duration in months, nD for the duration in days, T for the time period in hours, minutes, and seconds. nH for the duration in hours, nM for the duration in minutes, nS for the duration in seconds. nS may also be substituted with n.nnns where the decimal point precedes fractions of seconds. Tenths (nS), hundredths (nS), and thousandths (nnnS) of a second can be shown. The number prefix (n) in each case is the duration in fractions of a second.

Time values that are not required may not be represented. For example, P12Y1M. When hours, minutes, and/or seconds are represented, "T" may precede the time values. For example, PT23H12M or P3Y1MT9H.

GDT Duration 12600 describes a time period with a particular length of an event or process. For instance, working time, duration of stay, or processing time. However, it may not be dependent on a fixed point in time.

(nnnn) EmailAddress

A GDT EmailAddress 12700 is the abbreviation for Electronic Mail Address and represents a digital and unique address in a mailbox system. An example of GDT EmailAddress 12700 is:

```
><EmailAddress>
    mailto:gunther.stuhec@sap.com
</EmailAddress.
```

The structure of GDT EmailAddress 12700 is depicted in FIG. 127. The GDT EmailAddress 12700 includes attribute protocolCode 12714. For GDT Email Address 12700, the Object Class is Email 12702, the Property is Address 12704, the Representation/Association term is Electronic Address 12706, the Type term is CCT 12708, the Type Name term is Electronic Address 12710. The GDT Email Address 12700 may be restricted 12712.

For GDT Protocol Code 12714, the Category is Attribute 12716, the Object Class is Email 12718, the Property is Protocol 12720, the Representation/Association term is Code 12722, the Type term is xsd 12724, the Type Name term is Token 12726, the Cardinality is zero or one 12728. The GDT Protocol Code 12714 is in default: EM (smtp) 12730.

The element content for GDT EmailAddress 12700 is structured using URL conventions. The syntax is specified in the IETF RFC 2396 recommendation. The additional attribute "protocolCode" is not necessary. The scheme is the uriType "mailto:." The part following the colon is the scheme-specific part that represents the respective email address.

If the email address is not based on the SMTP address, another URI scheme according to the IETF RFC 2717 specifications can be applied or the relevant email address can be indicated by an additional "protocolCode" attribute.

Various codes may be used for protocolCode for specification of an address representation of a particular message protocol. For this email address type, the codes from the UN/EDIFACT DE 3155 "Communication Address Code Qualifier" code list may be used. It is not necessary to state the attribute because "EM" is the default value for the SMTP protocol. The main codes are AB (SITA), AD (AT&T mailbox), AF (U.S. Defense Switched Network), AN (ODETTE File Transfer Protocol), AO (Uniform Resource Location), EI (EDI transmission), EM (Electronic Mail Exchange of mail by electronic means), FT (File transfer access method according to ISO), GM (General Electric Information Service), IM (Internal mail), SW (S.W.I.F.T.) and XF (X.400 address).

(oooo) EvaluatedReceiptSettlemendIndicator

An GDT EvaluatedReceiptSettlementIndicator 12800 indicates whether the evaluated receipt settlement (ERS) procedure is to be used for settlement or not. An example of GDT EvaluatedReceiptSettlemendIndicator 12800 is:

<EvaluatedReceiptSettlemendIndicator>false</EvaluatedReceiptSettlemendIndicator>.

The structure of GDT EvaluatedReceiptSettlemendIndicator 12800 is depicted in FIG. 128. For GDT Evaluated Receipt Settlement Indicator 12800, the Property Qualifier term is Evaluated Receipt 12802, the Representation/Association term is Settlement 12804, the Type term is CCT 12806 and the Type Name term is Indicator 12808.

The GDT EvaluatedReceiptSettlemendIndicator 12800 can have the values true or false. True indicates that the evaluated receipt settlement (ERS) procedure is to be used for settlement. False indicates the evaluated receipt settlement (ERS) procedure shall not be used for settlement.

In the ERS procedure, payment is made directly on receipt of the goods, without the need for an invoice.

(pppp) ExchangeRate

GDT ExchangeRate 12900 is the representation of an exchange rate between two currencies. An example of GDT ExchangeRate 12900 is:

```
<ExchangeRate>
<UnitCurrency>EUR</UnitCurrency>
<QuotedCurrency>USD</QuotedCurrency>
<Rate>1.1234</Rate>
</ExchangeRate>.
```

The structure of GDT ExchangeRate 12900 is depicted in FIG. 129. The GDT ExchangeRate 12900 includes elements UnitCurrency 12906, QuotedCurrency 12922, Rate 12938, and QuotationDateTime 12956. For GDT Exchange Rate 12900, the Object Class is Exchange Rate 12902 and the Representation/Association term is Details 12904.

For GDT Unit Currency 12906, the Category is Element 12908, the Object Class is Exchange Rate 12910, the Property is Unit Currency 12912, the Representation/Association term is Code 12914, the Type term is GDT 12916, the Type Name term is Currency Code 12918, and the Cardinality is one 12920.

For GDT Quoted Currency 12922, the Category is Element 12924, the Object Class is Exchange Rate 12926, the Property is Quoted Currency 12928, the Representation/Association term is Code 12930, the Type term is GDT 12932, the Type Name term is Currency Code 12934, and the Cardinality is one 12936.

For GDT Rate 12938, the Category is Element 12940, the Object Class is Exchange Rate 12942, the Property is Rate 12944, the Representation/Association term is Rate 12946, the Type term is xsd 12948, the Type Name term is Decimal 12950, the Length is fourteen 12952, and the Cardinality is one 12954.

For GDT Quotation Date Time 12956, the Category is Element 12958, the Object Class is Exchange Rate 12960, the Property is Quotation Date Time 12962, the Representation/Association term is Date Time 12964, the Type term is GDT 12966, the Type Name term is Date Time 12968, and the Cardinality is zero or one 12970.

UnitCurrency refers to the "Leading currency." QuotedCurrency refers to the "Following currency." Rate refers to the exchange rate between these currencies. This corresponds to the price at which one unit of the currency UnitCurrency can be changed into the currency QuotedCurrency. QuotationDateTime refers to the exchange rate date and time when the exchange rate was defined. Specifying an exchange rate date may be optional.

One example use of GDT ExchangeRate 12900 is when an incoming invoice was received with currency Dollar. A different currency is to be used for the payment. The GDT ExchangeRate 12900 between invoice and payment currency may be transmitted to the Payment System. Another example is when current exchange rates are transmitted to an ERP system daily from a provider such as Reuters.

The exchange rate is calculated using the formula: 1 UnitCurrency=Rate*QuotedCurrency.

(qqqq) ExponentialRepresentationTypeCode

The GDT ExponentialRepresentationTypeCode 13000 is a coded representation for how a number is displayed in exponential form in base 10. An example of GDT ExponentialRepresentationTypeCode 13000 is: <ExponentialRepresentationTypeCode>1</ExponentialRepresentationTypeCode>.

The structure of GDT ExponentialRepresentationTypeCode 13000 is depicted in FIG. 130. For GDT Exponential Representation Type Code 13000, the Object Class is Exponential Representation Type 13002, the Representation/Association term is Code 13004, the Type term is CCT 13006, the Type Name term is Code 13008, the Length is one 13010. The GDT Exponential Representation Type Code 13000 may be restricted 13012.

An exponential form in base 10 comprises the mantissa, as a real number with predecimal and decimal places, and a whole number exponent for base 10, where the mantissa and exponent are separated by "E-". In English, the mantissa is specified with a decimal point and a comma is used for thousands.

GDT ExponentialRepresentationTypeCode 13000 can have the values 1, 2 or 3. 1 means exactly one predecimal place in the mantissa. 2 means one fixed predefined exponent. 3 means a maximum of three predecimal places in the mantissa. If the template is exceeded when code 3 is used, the exponent is increased by 3.

The GDT ExponentialRepresentationTypeCode 13000 regulates the format of an exponential number (e.g., on a monitor or printout) but does not affect the technical representation when data is transferred or stored. The format is not a function of the user, but of the purpose and consequently of the instance of the data type.

The GDT ExponentialRepresentationTypeCode 13000 corresponds to the coding for the exponential representation type in R/3 classification. In the case of code 2, the GDT PropertyDataType may also contain an additional attribute, which contains the value of the exponent.

(rrrr) FixedIndicator

A GDT FixedIndicator 13100 indicates whether a value/object is fixed or not. 'Fixed' means that the value/object is limited in its use, for example, it may not be changed. An example of GDT FixedIndicator 13100 is: <FixedIndicator>true</FixedIndicator>.

The structure of GDT FixedIndicator 13100 is depicted in FIG. 131. For GDT Fixed Indicator 13100, the Property is Fixed 13102, the Representation/Association term is Indicator 13104, the Type term is CCT 13106 and the Type Name is Indicator 13108.

GDT FixedIndicator 13100 can have the values true or false. True indicates a value/object is fixed. False indicates a value/object is not fixed. The business meaning of the fixing may be specified in the context of the interface.

(ssss) FloatValue

A GDT FloatValue 13200 is a numeric value represented as a floating point number. An example of GDT FloatValue 13200 is:

```
<PropertyValue>
    <FloatValue>6.02214E+23</FloatValue>
</PropertyValue>.
```

The structure of GDT FloatValue 13200 is depicted in FIG. 132. For GDT Float Value 13200, the Representation/Association Qualifier term is Float 13202, the Representation/

Association term is Value 13204, the Type term is xsd 13206, the Type Name term is Float 13208.

GDT FloatValue 13200 is a qualified basic GDT based on the secondary Representation/Association Value of the CCT Numeric. GDT FloatValue 13200 is used if the explicit reference to the floating point representation of the element based on GDT FloatValue 13200 is both meaningful and desired from a semantic perspective. This is the case with mathematical and technical numeric values. The Float qualifier then becomes part of the element name.

Numeric business values are not generally defined using their floating point representation. Instead, this representation derives implicitly from the semantics of the numeric value. An example of this is Measure. FloatValue is not used if this is the case.

(tttt) FollowUpBusinessTransactionDocumentRequirementCode

The GDT FollowUpBusinessTransactionDocumentRequirementCode 13300 is a coded representation of the need for a follow-up document. An example of GDT FollowUpBusinessTransactionDocumentRequirementCode 13300 is:

<FollowUpInvoiceRequirementCode>01</FollowUpInvoiceRequirementCode>.

The structure of GDT FollowUpBusinessTransactionDocumentRequirementCode 13300 is depicted in FIG. 133. For GDT FollowUp Business Transaction Document Requirement Code 13300, the Object Class Qualification term is Follow Up 13302, the Object Class is Business Transaction Document 13304, the Property is Requirement 13306, the Representation/Association term is Code 13308, the Type term is CCT 13310, the Type Name term is Code 13312, and the Length is 2 13314. The GDT FollowUp Business Transaction Document Requirement Code 13300 Enumeration="01 02 03 04 05" 13316.

The GDT FollowUpBusinessTransactionDocumentRequirementCode 13300 can have the values 01 through 05. 01 means the follow-up document is required in the subsequent process. 02 means the follow-up document is expected in the subsequent process, but optional. 03 means the follow-up document may be optional. 04 means the follow-up document is not expected, but can be received and processed. 04 means the follow-up document is forbidden, therefore it cannot be received or processed.

The GDT FollowUpDocumentRequirementCode 13300 is used to control the exchange of documents within a business process at runtime. It may refer from the context in which it is used to a follow-up document. When the GDT is used in a document, "BusinessTransactionDocument" is replaced by the respective follow-up document, for example, Invoice. A default procedure may be specified every time a GDT FollowUpBusinessTransactionRequirementCode 13300 is used.

For example in an order process, the buyer uses a GDT FollowUpDocumentRequirementCode 13300 in the purchase order to specify that an order confirmation is "unexpected." This means that the buyer does not expect a confirmation as part of the business transaction but is able to receive and file a confirmation.

The GDT FollowUpBusinessTransactionDocumentRequirementCode 13300 may be a proprietary code list with fixed predefined values. Changes to the permitted values involve changes to the interface.

In addition to the GDT FollowUpBusinessTransactionDocumentRequirementCode 13300, which refers to follow-up documents, there is also a GDT FollowUpMessageRequirementCode, which refers to follow-up messages. When used in a message, a check may be performed to determine which of these GDTs may be used.

(uuuu) FollowUpMessageRequirementCode

The GDT FollowUpMessageRequirementCode 13400 is a coded representation of the necessity of a follow-up message. An example of GDT FollowUpMessageRequirementCode 13400 is:

<FollowUpInvoiceRequestRequirementCode>01</FollowUpInvoiceRequestRequirementCode>.

The structure of GDT FollowUpMessageRequirementCode is 13400 depicted in FIG. 134. For GDT FollowUp Message Requirement Code 13400, the Object Class Qualification term is Follow Up 13402, the Object Class is Message 13404, the Property is Requirement 13406, the Representation/Association term is Code 13408, the Type term is CCT 13410, the Type Name term is Code 13412, and the Length is 2 13414. The GDT FollowUp Message Requirement Code 13400 may be restricted 13416.

GDT FollowUpMessageRequirementCode 13400 can have the values 01 through 05. 01 means the follow-up message is necessary in the subsequent process. 02 means the follow-up message is expected in the subsequent process, but is optional. 03 means the follow-up message may be optional. 04 means the follow-up message is not expected, but can be received and processed. 05 means the follow-up message is forbidden, therefore it cannot be received or processed.

The GDT FollowUpMessageRequirementCode 13400 is used to control the exchange of messages within a business process at runtime. It may always refer from the context in which it is used to a follow-up message. When the GDT is used in a document, "Message" is replaced by the respective follow-up message, for example, InvoiceRequest. The follow-up message names that are permitted are listed in the GDT:MessageTypeCode.

A default procedure may be specified every time a GDT FollowUpMessageRequirementCode 13400 is used. For example, in an order process, the buyer uses a GDT FollowUpMessageRequirementCode 13400 in the purchase order to specify that an order confirmation is "unexpected." This means that the buyer does not expect an confirmation as part of the business transaction but is able to receive and file a confirmation.

The GDT FollowUpMessageRequirementCode 13400 may be a proprietary code list with fixed predefined values. Changes to the permitted values involve changes to the interface.

In addition to the GDT FollowUpMessageRequirementCode 13400, which refers to follow-up messages, there is also a GDT FollowUpBusinessTransactionDocumentRequirementCode, which refers to follow-up documents. When used in a message, a check may be performed to determine which of these GDTs may be used.

(vvvv) GeoCoordinates

GDT GeoCoordinates 13500 contain the geographic data, in other words longitude and latitude specified as per the WGS84 reference system, which enables one to determine a position on the globe. An example of GDT GeoCoordinates 13500 is:

```
<GeoCoordinates>
    <LatitudeMeasure unitCode="DD">40.23232300000
    </LatitudeMeasure>
    <LongitudeMeasure unitCode="DD">123.12121200000
    </LongitudeMeasure>
</GeoCoordinates>.
```

In the above example, the unitCode "DD" corresponds to the unit degree of an angle.

The structure of GDT GeoCoordinates 13500 is depicted in FIG. 135. The GDT GeoCoordinates 13500 includes elements LatitudeMeasure and Longitude Measure. For GDT GeoCoordinates 13500, the Object Class is GeoCoordinates 13502, the Representation/Association term is Details 13504.

LatitudeMeasure refers to the geographic latitude in degrees. The degrees unit of measurement is specified by the attribute "unitCode." For GDT Latitude Measure 13506, the Category is E 13508, the Object Class is GeoCoordinates 13510, the Property is Latitude 13512, the Representation/Association term is Measure 13514, the Type term is GDT 13516, the Type Name term is Measure 13518, the Cardinality is one 13520.

LongitudeMeasure refers to the Geographic longitude in degrees. The degrees unit of measurement is specified by the attribute "unitCode." For GDT Longitude Measure 13522, the Category is E 13524, the Object Class is GeoCoordinates 13526, the Property is Longitude 13528, the Representation/Association term is Measure 13530, the Type term is GDT 13532, the Type Name term is Measure 13534, the Cardinality is one 13536.

In general, southern latitudes are negative and northern latitudes are positive. Western longitudes are negative and eastern longitudes are positive. It is also not necessary to use the positive sign (+) for positive values. Negative values may have a negative sign (−) for a prefix.

The specification of longitude and latitude corresponds to spherical coordinates. The definition range for LatitudeMeasure is −90 to +90. The definition range for LongitudeMeasure is −180 to +180. Specifications outside the definition range, for example, +190 for longitude or −100 for latitude, may result in an error.

GDT GeoCoordinates 13500 may be used in the field of transport planning. The geodata are determined from the address data of a customer to calculate the time required for transport, the distance to be covered, and the speed of the means of transport used.

Another usage is may be to locate suitable garages in the case of an accident or breakdown in a specific area. The garages are geo-coded using their addresses and are available for such an enquiry.

(wwww) HandlingUnit

A HandlingUnit 13600 is a physical unit of packaging materials (load carrier, additional packaging materials) and the packaged products (type "Material"). An example of HandlingUnit 13600 is:

```
Example 1: Handling Unit with a load of 10 boxes of a product
<HandlingUnit>
    <ID>4711</ID>
    <LoadCarrier>
        <Product>
            <StandardID schemeAgencyID="DUNS">123456789
</StandardID>
        </Product>
    </LoadCarrier>
    <Load>
        <BusinessTransactionDocumentReference>
            <ItemID>LF800001</ItemID>
        </BusinessTransactionDocumentReference>
        <Quantity unitCode="CT" >10</Quantity>
    </Load>
</HandlingUnit>.
Example 2: Handling Unit with Lower-Level Handling Unit
<HandlingUnit>
    <ID>4712</ID>
<LoadCarrier>
    <Product>...</Product>
</LoadCarrier>
<LowerLevelHandlingUnit>
    <ID>4711</ID>
    </LowerLevelHandlingUnit>
</HandlingUnit>.
```

The structure of HandlingUnit 13600 is depicted in FIG. 136. For Handling Unit 13600, the Object Class is Handling Unit 13602, the Representation/Association term is Details 13604.

ID identifies the handling unit. For ID 13606, the Object Class is Handling Unit 13608, the Property is Identification 13610, the Representation/Association term is Identifier 13612, the Type term is GDT 13614, the Type Name term is Identifier 13616, the Length is from one to twenty 13618, and the Cardinality is one 13620.

LoadCarrier refers to the device with which physical objects can be stored or transported. Examples of load carriers include crates, nestings, containers, mesh box pallets, and pallets. For Load Carrier 13622 the Object Class is Handling Unit 13624, and the Cardinality is one 13626.

LoadCarrierProduct refers to the product ID of the load carrier. For Product 13626, the Object Class is Load Carrier 13628, the Property is Product 13630, the Type term is GDT, the Type Name term is Business Transaction Document Production 13632, and the Cardinality is one 13634. The Product 13626 may be restricted 13636.

HeightMeasure refers to the height of the handling unit. For Height Measure 13638, the Object Class is Handling Unit 13640, the Property Qualifier term is Height 13642, the Property is Measure 13644, the Representation/Association term is Measure 13646, the Type term is GDT 13648, the Type Name term is Measure 13650, the Length is maximum 19 predecimal and 6 decimal digits 13652, and the Cardinality is zero or one 13654.

LengthMeasure refers to the length of the handling unit. For Length Measure 13656, the Object Class is Handling Unit 13658, the Property Qualifier term is Length 13660, the Property is Measure 13662, the Representation/Association term is Measure 13664, the Type term is GDT 13666, the Type Name term is Measure 13668, the Length is maximum 19 predecimal and 6 decimal digits 13670, and the Cardinality is zero or one 13672.

WidthMeasure refers to the width of the handling unit. For Width Measure 13674, the Object Class is Handling Unit 13676, the Property Qualifier term is Width 13678, the Property is Measure 13680, the Representation/Association term is Measure 13682, the Type term is GDT 13684, the Type Name term is Measure 13686, the Length is maximum 19 predecimal and 6 decimal digits 13688, and the Cardinality is zero or one 13690.

GrossVolumeMeasure refers to the total volume of the load carrier for a closed load carrier (wire basket) or total of packaging material and the contents for open packaging materials (pallets). For Gross Volume Measure 13692, the Object Class is Handling Unit 13694, the Property Qualifier term is Length 13696, the Property is Measure 13698, the Representation/Association term is Measure 13699, the Type term is GDT 13601, the Type Name term is Measure 13602A, the Length is maximum 19 predecimal and 6 decimal digits 13603A, and the Cardinality is zero or one 13604A.

GrossWeightMeasure refers to the total weight of packaging material and complete contents. For Gross Weight Measure 13605A, the Object Class is Handling Unit 13606A, the Property Qualifier term is Weight 13607A, the Property is Measure 13608A, the Representation/Association term is Measure 13609A, the Type term is GDT 13610A, the Type Name term is Measure 13611A, the Length is maximum 19 predecimal and 6 decimal digits 13612A, and the Cardinality is zero or one 13613A.

AdditionalPackaging refers to additional packaging materials. Together with the load carrier used, these are intended for fulfilling the requirements of the materials to be packed in terms of fixing, securing, and filling. With the load carrier, they constitute the packaging of a handling unit (examples: lid, intermediate layers, frames, shrink-wrap, padding material). For Additional Packaging 13614A, the Object Class is Handling Unit 13615A, and the Cardinality is from zero to n 13616A.

AdditionalPackaging Product refers to the product ID of a packaging material/additional packaging material. For Product 13616A, the Object Class is Additional Packaging 13617A, the Property is Product 13618A, the Type term is GDT 13619A, the Type Name term is Business Transaction Document Product 13620A, and the Cardinality is one 13621A. The Product 13616A may be restricted 13622A.

For Quantity 13623A, the Object Class is Additional Packaging 13624A, the Property is Quantity 13625A, the Property/Association term is Quantity 13626A, the Type term is GDT 13627A, the Type Name term is Quantity 13628A, the Length is maximum 19 predecimal and 6 decimal digits 13629A, and the Cardinality is one 13630A.

AdditionalPackaging Quantity refers to the quantity of a packaging material/additional packaging material used in the specified handling unit.

A handling unit can consist of an empty load carrier. It is therefore beneficial to specify the HandlingUnitID and the load carrier, whereas packed products (loads), lower-level handling units, packaging materials, and additional packaging materials are optional. LowerLevelHandlingUnit refers to a lower-level handling unit for displaying a hierarchy of handling units. For Lower Level Handling Unit 13631A, the Object Class is Handling Unit 13632A, and the Cardinality is from zero to n 13633A.

For ID 13634A, the Object Class is Lower Level Handling Unit 13635A, the Property is Identification 13636A, the Representation/Association term is Identifier 13637A, the Type term is GDT 13638A, the Type Name term is Handling Unit ID 13639A, the Length is from one to twenty 13640A, and the Cardinality is one 13641A.

Load refers to the load (quantity of a product) packed in the specified handling unit without lower-level handling units. The load in a handling unit is characterized by referencing the item in a business document that contains information about the type and quantity of a product. For Load 13642A, the Object Class is Handling Unit 13643A, the Property is Load 13644A, and the Cardinality is from zero to n 13645A.

LoadBusinessTransactionDocumentReference is a reference to the item in a business document that contains more specific details to the load packed in the handling unit. For Business Transaction Document Reference 13645A, the Object Class is Load 13646A, the Property is Business Transaction Document 13647A, the Type term is GDT 13648A, the Type Name term is Business Transaction Document Reference 13649A, the Cardinality is one 13650A.

For ID 13651A, the Object Class is Business Transaction Document 13652A, the Property is Identification 13653A, the Representation/Association term is Identifier 13654A, the Type term is GDT 13655A, the Type Name term is Business Transaction Document ID 13656A, the Length is from one to thirty-five 13657A, and the Cardinality is zero or one 13658A.

For Item ID 13659A, the Object Class is Business Transaction Document Item 13660A, the Property is Identification 13661A, the Representation/Association term is Identifier 13662A, the Type term is GDT 13663A, the Type Name term is Business Transaction Document Item ID 13664A, the Length is from one to ten 13665A, and the Cardinality is one 13666A.

AdditionalPackaging Quantity refers to the quantity of a packaging material/additional packaging material used in the specified handling unit.

LoadQuantity refers to the quantity of the load packed in the specified handling unit without lower-level handling units. For Quantity 13666A, the Object Class is Load 13667A, the Property is Quantity 13668A, the Representation/Association term is Quantity 13669A, the Type term is GDT 13670A, the Type Name term is Quantity 13671A, the Length is from maximum 19 predecimal and 6 decimal digits 13672A, and the Cardinality is one 13673A.

In an embodiment, the product quantity in the referenced item is not less than the LoadQuantity specified in the HandlingUnit 13600. If the business document referenced in the handling unit directly concerns the document in which the handling unit is used, the identification of the business document (but not of the item) can be left out.

HandlingUnit 13600 maps the packaging/packaging hierarchy of products. The HandlingUnit 13600 simplifies logistics processes: It enables the production- or sales-controlled combination of various products/same products with inconsistent packaging sizes in physical storage units or delivery units; and, using the link to batch numbers and serial numbers, it enables an improved logistical check, which may be necessary for effective processing.

The structure of the GDTs HandlingUnit 13600 is compatible with the "packaging" in the DELVRY03 IDoc. A handling unit has a unique scanable identification number that can be used to call up data for the handling unit.

(xxxx) Incoterms

GDT Incoterms 13700 are commercial contract formulae for the delivery conditions that correspond to the rules compiled by the International Chamber of Commerce (ICC). An example of Incoterms is:

```
<Incoterms>
    <ClassificationCode>FOB</ClassificationCode >
    <TransferLocationName>Hamburg</TransferLocationName>
</Incoterms>.
```

The structure of GDT Incoterms 13700 is depicted in FIG. 137. The GDT Incoterms 13700 includes elements ClassificationCode and TransferLocationName. For GDT Incoterms 13700, the Object Class is Incoterms 13702 and the Representation/Association term is Details 13704.

ClassificationCode refers to the coded representation of the internationally used abbreviation for characterizing delivery conditions. ClassificationCode is a three-character field and can accept the values EXW (Ex Works), FCA (Free Cargo), FAS (Free Alongside Ship), FOB (Free on Board), CFR (Cost & Freight), CIF (Cost, Insurance & Freight to named destination), CPT (Freight, Carriage paid to destination), CIP (Freight, Carriage, Insurance to destination), DAF (Delivery at frontier—Named place), DES (Delivered Ex Ship—Named port of destination), DEQ (Delivered Ex Quay—Duty paid, Named port), DDU (Delivered duty unpaid to destination), DDU (Delivered duty unpaid to destination). For Classification Code 13706, the Category is E 13708, the Object Class is Incoterms 13710, the Property is Classification 13712, the Representation/Association term is Code 13714, the Type term is CCT 13716, the Type Name term is Code 13718, the Length is three 13720, and the Cardinality is one 13722. The Classification Code 13706 may be restricted 13724.

TransferLocationName refers to a place (place, port of shipment, port of destination, place of destination) to which the above code refers. For example, it may refer to the port of shipment in the case of FOB. For Transfer Location Name 13726, the Category is Element 13728, the Object Class is Incoterms 13730, the Property is Transfer Location Name 13732, the Representation/Association term is Name 13734, the Type term is GDT 13736, the Type Name term is Name 13738, the Length is from one to twenty-eight 13740, and the Cardinality is zero or one 13742. The Transfer Location Name 13726 may be restricted 13744.

GDT Incoterms 13700 are used in the transmission of an order to establish the delivery conditions agreed upon by the business partners.

(yyyy) InformationOutdatedIndicator

A GDT InformationOutdatedIndicator 13800 indicates whether information is outdated or not. An example of GDT InformationOutdatedIndicator 13800 is: <InformationOutdatedIndicator>false</InformationOutdatedIndicator>.

The structure of GDT InformationOutdatedIndicator 13800 is depicted in FIG. 138. For GDT Information Outdated Indicator 13800, the Object Class is Information 13802, the Property is OutdatedIndicator 13804, the Representation/Association term is Indicator 13806, the Type term is CCT 13808, and the Type Name term is Indicator 13810.

The GDT InformationOutdatedIndicator 13800 can have the values true or false. True indicates that information contained in the message is outdated. False indicates that information contained in the message is not outdated.

One example is the purchase order information message, which also contains confirmed quantities and deadlines. The InformationOutdatedIndicator indicates whether the confirmed quantities and deadlines relate to the current PO information or whether the PO has been changed since the last confirmation was received.

It may be clear from the context of the interface which information is outdated. This can be done by extending the name (e.g., ConfirmationInformationOutdatedIndicator).

(zzzz) IntegerValue

An GDT IntegerValue 13900 is an integer. An integer can be regarded as a numerical decimal value without decimal places. An example of GDT IntegerValue 13900 is:

```
<PropertyValue>
    <IntegerValue>42</IntegerValue>
</PropertyValue>.
```

The structure of GDT IntegerValue 13900 is depicted in FIG. 139. For GDT IntegerValue 13900, the Representation/Association Qualifier term is Integer 13902, the Representation/Association term is Value 13904, the Type term is xsd 13906, and the Type Name term is Integer 13908.

GDT IntegerValue 13900 is a qualified basic GDT based on the secondary Representation/Association Value of the CCT Numeric. IntegerValue is used when the explicit reference to the integer representation of the element based on IntegerValue is both meaningful and desired from a semantic perspective. This is the case with rounded or estimated values. The Integer qualifier then becomes part of the relevant element name.

Generally, numeric business values are not defined using their integer representation. Instead, this representation is derived implicitly from the semantics of the numeric value. Examples of this include OrdinalNumberValue or DunningCounterValue. In this case, GDT IntegerValue 13900 is not used.

(aaaaa) InterfaceElementID

An GDT InterfaceElementID 14000 is a unique identifier for an element in an interface. An example of GDT InterfaceElementID 14000 is:

<InterfaceElementID schemeID='Open Catalog Interface' schemeAgencyID='123456789' schemeAgencySchemeID='DUNS' schemeAgencySchemeAgencyID='016'>NEW_ITEM-DESCRIPTION</InterfaceElementID>.

The structure of GDT InterfaceElementID 14000 is depicted in FIG. 140. For GDT InterfaceElementID 14000, the Object Class is Interface Element 14002, the Representation/Association term is Identifier 14004, the Type term is CCT 14006, the Type Name term is Identifier 14008, and the Length is from one to forty 14010. The GDT Interface Element ID 14000 may be restricted 14012.

For Scheme ID 14014, the Category term is Attribute 14016, the Object Class is Identification Scheme 14018, the Representation/Association term is Identifier 14020, the Type term is xsd 14022, the Type Name term is Token 14024, the Length is from one to sixty 14026, and the Cardinality is zero or one 14028.

For Scheme Agency ID 14030, the Category term is Attribute 14032, the Object Class is Identification Scheme Agency 14034, the Representation/Association term is Identifier 14036, the Type term is xsd 14038, the Type Name term is Token 14040, the Length is from one to sixty 14042, and the Cardinality is zero or one 14044.

For Scheme Agency Scheme ID 14046, the Category term is Attribute 14048, the Object Class is Identification Scheme Agency 14050, the Property is Scheme 14052, the Representation/Association term is Identifier 14054, the Type term is xsd 14056, the Type Name term is Token 14058, the Length is from one to sixty 14060, and the Cardinality is zero or one 14062.

For Scheme Agency Scheme Agency ID 14064, the Category term is Attribute 14066, the Object Class is Identification Scheme Agency 14068, the Property is Scheme Agency 14070, the Representation/Association term is Identifier 14072, the Type term is xsd 14074, the Type Name term is Token 14076, the Length is three 14078, and the Cardinality is zero or one 14080.

The permitted values depend on the corresponding interface and may be taken from its documentation. The attribute schemeID identifies the interface, schemeAgencyID identifies the issuer of the interface, which may be unique in the context of the attributes schemeAgencySchemeID and schemeAgencySchemeAgencyID. For more information about the use of the attributes schemeID, schemeAgencyID, schemeAgencySchemeID, and schemeAgencySchemeAgencyID, see the discussion for the CCT Identifier.

In an embodiment, the GDT InterfaceElementID 14000 may not be used to refer to elements of XML interfaces. If necessary, there may be an examination of how an element of an XML interface is identified and how the attributes are to be used in this case. GDT InterfaceElementID 14000 is used to assign references to interface elements of various e-procurement systems to characteristics within a catalog. For example, the "Open Catalog Interface" can be used to link Web-based purchasing catalogs to an e-procurement system. A user calls up a catalog from the e-procurement system, searches for products in this catalog, and makes a selection. When this is transmitted to the virtual shopping cart of the e-procurement system (user purchase order), characteristics of the product are transmitted to the e-procurement using the above-mentioned interface. The GDT InterfaceElementID 14000 contains the interface element identification of the calling e-procurement system for each characteristic and enables the characteristics to be assigned correctly to the elements of the e-procurement interface.

(bbbbb) IntervalBoundaryTypeCode

An GDT IntervalBoundaryTypeCode 14100 is a coded representation of an interval boundary type. An example of GDT IntervalBoundaryTypeCode 14100 is:
<IntervalBoundaryTypeCode>3</IntervalBoundaryTypeCode>.

The structure of GDT IntervalBoundaryTypeCode 14100 is depicted in FIG. 141. For the GDT Interval Boundary Type Code 14100, the Property is Interval Boundary Type 14102, the Representation/Association is Code 14104, the Type is CCT 14106, the Type Name is Code 14108, and the Length is one 14110. The GDT IntervalBoundaryTypeCode 14100 may be a restricted GDT.

An element of type GDT IntervalBoundaryTypeCode 14100 can have the values 1 through 9. 1 corresponds to a single value X. 2 corresponds to an interval with a closed lower interval boundary and an open upper interval boundary; [X,Y). 3 corresponds to an interval with a closed upper and lower interval boundary; [X,Y]. 4 corresponds to an interval with an open upper and lower interval boundary; (X,Y). 5 corresponds to an interval with an open lower interval boundary and a closed upper interval boundary; (X,Y]. 6 corresponds to an interval with an unlimited lower boundary and an open upper boundary;<X. 7 corresponds to an interval with an unlimited lower boundary and a closed upper boundary;<=x. 8 corresponds to an interval with an open lower boundary and an unlimited upper boundary;>X. 9 corresponds to an interval with a closed lower boundary and an unlimited upper boundary;>=X.

The values that are expressed by the interval relationship may belong to the same ordinal scale. The meaning of scale values established by the GDT IntervalBoundaryTypeCode 14100 is used to describe intervals by their boundaries. One use relates to property values and property valuations.

The GDT IntervalBoundaryTypeCode 14100 may be a proprietary code list with fixed predefined values. Changes to the permitted values may involve changes to the interface.

(ccccc) InventoryUsabilityStatusCode

The GDT InventoryUsabilityStatusCode 14200 is the encoded representation of the usability of a warehouse inventory for company-specific business processes. An example of GDT InventoryUsabilityStatusCode 14200 is:
<InventoryUsabilityStatusCode>1</InventoryUsabilityStatusCode>.

The structure of GDT InventoryUsabilityStatusCode 14200 is depicted in FIG. 142. For the GDT Inventory Usability Status Code 14200, the Object Class is Inventory 14202, the Property is Usability Status 14204, the Representation/Association Code is 14206, the Type CCT is 14208, the Type Name is Code 14210, and the Length is from one to two 14212. The GDT InventoryUsabilityStatusCode 14200 may be a restricted GDT.

The value range of the GDT InventoryUsabilityStatusCode 14200 may comprise a proprietary code list. Possible values are 1 through 6. 1 means the stock can be used as necessary for business processes. 2 means the stock is blocked for business processes. 3 means the usage of stock is subject to certain restrictions. 4 means the InventoryUsabilityStatusCode of the stock is not defined more precisely, i.e., no other status is specified. 4 means the stock is in quality inspection. 6 means the stock is a goods return. Depending on the coded value, certain business processes can be allowed for a warehouse stock, however, others may not be allowed.

The usage can be clarified using a concrete business process as an example: At a goods receipt for a purchase order, the GDT InventoryUsabilityStatusCode 14200 "quality inspection" is assigned to the stock delivered since Quality Control may inspect the quality of the received stock. Depending on this inspection, parts of the stock are then posted to the GDT InventoryUsabilityStatusCode 14200 "unrestricted use" or "blocked." The GDT InventoryUsabilityStatusCode 14200 is used for transmitting stock changes from Inventory Management to Accounting and to Logistics Planning. Different InventoryUsabilityStatusCodes can cause a different stock valuation in Accounting and are handled differently in planning.

A warehouse inventory is a quantity of material at a certain location. For example, 17 pieces of material "42" at storage location "17-05-72".

(ddddd) InvoiceCancellationInvoiceIndicator

An GDT InvoiceCancellationInvoiceIndicator 14300 indicates whether an invoice is a cancellation invoice or not. An example of GDT InvoiceCancellationInvoiceIndicator 14300 is:
<InvoiceCancellationInvoiceIndicator>true</InvoiceCancellationInvoiceIndicator>.

The structure of GDT InvoiceCancellationInvoiceIndicator 14300 is depicted in FIG. 143. For the GDT Invoice Cancellation Invoice Indicator 14300, the Object Class Invoice is 14302, the Property is Cancellation Invoice Indicator 14304, the Representation/Association is Indicator 14306, the Type is CCT 14308, and the Type Name is Indicator 14310.

The GDT InvoiceCancellationInvoiceIndicator 14300 can have the values true or false. True indicates that the invoice is a cancellation invoice. False indicates that the invoice is not a cancellation invoice.

A cancellation invoice is a newly created invoice that renders a previously generated invoice or parts of it invalid. This is done by marking the new invoice with the GDT InvoiceCancellationInvoiceIndicator 14300 (value 'true'). Marking an invoice using the GDT InvoiceCancellationInvoiceIndicator 14300 is specific to invoices. If an invoice contains errors, is incorrect, or has been created for services that have not been provided, it may not be canceled itself. The correction may be made via an additional, appropriately marked invoice. A cancellation invoice may not be equated with a credit memo, even if from an accounting point of view the original invoiced amount can be credited using the invoice marked as a cancellation invoice.

For example, the distinction is made in R/3 using the sales document type. In particular, the distinction between 'cancellation invoice' and 'cancellation credit memo' needs to be observed here.

(eeeee) InvoiceIntraCorporateIndicator

A GDT InvoiceIntraCorporateIndicator 14400 indicates whether or not an invoice is between independent companies in a corporate group. An example of GDT InvoiceIntraCorporateIndicator 14400 is:
<InvoiceIntraCorporateIndicator>true</InvoiceIntraCorporateIndicator>.

The structure of GDT InvoiceIntraCorporateIndicator 14400 is depicted in FIG. 144. For the GDT Invoice Corporate Indicator 14400, the Object Class is Invoice 14402, the Property is Intra Corporate Indicator 14404, the Representation/Association is Indicator 14406, the Type is CCT 14408, the Type Name is Indicator 14410. The Indicator may have the values true or false. True indicates the invoice is between two companies within a corporate group. False indicates the invoice is to a company that does not belong to the corporate group or is an invoice to an end customer.

The creation of invoices between companies in a corporate group is sometimes also referred to as "Intercompany Billing." For example, a customer places an order with company C1, which also sends the invoice to the customer. Delivery of goods, however, is performed by company C2 of the same group. C1 gathers all revenue, while C2 incurs the costs. This makes a settlement between the two companies necessary, which may require an invoice in the case of legally independent companies.

Therefore, two invoices may be created for one business transaction (in the example of the customer order), whose differing semantics are made explicit by the indicator. Distinction between the two is necessary, since different prices are applied in invoicing and the invoice to the customer affects the status of the order item.

If more than two companies in one corporate group are involved in a business transaction, further invoices can result—this is known as Chain Invoicing. However, differentiation of invoices between these companies may not be required in that case.

In an example, the distinction is made in R/3 using the sales document type.

(fffff) LanguageCode

The GDT LanguageCode 14500 is a coded representation for the language. An example of GDT LanguageCode 14500 is: <OrderLanguageCode>de</OrderLanguageCode>.

The structure of GDT LanguageCode 14500 is depicted in FIG. 145. The GDT Language Code 14500, the Object Class is Language 14502, the Property is Identification 14504, the Representation is Code 14506, the Type is xsd 14508, the Type Name is language 14510, the Length is from two to nine 14512.

GDT LanguageCode 14500 is from the Core Component Type "Code." GDT LanguageCode 14500 is based on the W3C "built-in" data type xsd:language. The language code of GDT LanguageCode 14500 is represented according to IETF RFC 3066. RFC 3066 includes two parts: a primary language code and a series of sub-codes. The primary language code can be an ISO 639-1-compliant (ISO 639:1988) two-character code or an ISO 639-2-compliant (ISO 639:1998) three-character code. If the language code is to occur in both standards, the two-character language code (ISO 639-1) may be used. The sub-codes can be used for differentiating the language according to special criteria or for different dialects within a single country. If the ISO 639-1 or 639-2-compliant codes are not sufficient, the ISO 3166-1-compliant two-character code is usually used as the first sub-code. Regional differences in a language within a single country can be defined by using the second ISO 3116-2-compliant two-character sub-code "Country Subdivision Code."

A GDT LanguageCode 14500 is represented as aa, anm, aa-CC, aaa-CC, aa-CC-RR, aaa-CC-RR. The literal aa/aaa stands for ISO 639-1 or ISO 639-2-compliant language code, CC stands for ISO 3166-1-compliant country code, and RR stands for ISO 3166-2-compliant "Country Subdivision Code".

GDTLanguageCode 14500 is used to identify the language for business documents or business partners. Furthermore, it enables a business partner to request a particular language. There is also a difference between inbound and outbound in the implementation of "LanguageCode." Outbound, mapping from, for example, the SAP language key to the ISO 639-1-compliant two-character ISO language code always occurs without language differentiation. Inbound, most SAP applications work internally with the SAP language key. These applications support the ISO 639-1-compliant two-character language code without a sub-code. Other language codes may be mapped to ISO 639-1 for these applications; otherwise an error may occur during inbound processing.

(ggggg) LanguageDependencyIndicator

A GDT LanguageDependencyIndicator 14600 indicates whether or not there is a language dependency. An example of GDT LanguageDependencyIndicator 14600 is: <LanguageDependencyIndicator>true</LanguageDependencyIndicator>.

The structure of GDT LanguageDependencyIndicator 14600 is depicted in FIG. 146. The GDT Language Dependency Indicator 14600, the Property is Language Dependency 14602, the Representation/Association is Indicator 14604, and the Type is CCT: Indicator 14606.

The GDT LanguageDependencyIndicator 14600 can have the values true (or 1) or false (or 0). True indicates language dependency. False indicates no language dependency.

The GDTLanguageDependencyIndicator 14600 is used in GDT PropertyDataType to indicate that values in character strings are language dependent.

(hhhhh) LegalEventTypeCode

The GDT LegalEventTypeCode 14700 is the coded representation of a legal transaction or an official or legal event. An example of GDT LegalEventTypeCode 14700 is:

```
<LegalEvent>
    <TypeCode>01</TypeCode>
</LegalEvent>.
```

The structure of GDT LegalEventTypeCode 14700 is depicted in FIG. 147. The GDT Legal Event Type Code 14700, the Object Class is Legal Event 14702, the Property is Type 14704, Representation/Association is Code 14706, the Type is CCT 14708, the Type Name is Code 14710, the Length is two 14712.

Values permitted for GDT LegalEventTypeCode 14700 are 01-20 and ZZ. 01 stands for foreclosure, 02 stands for Law suit, 03 stands for Outstanding Judgment, 04 stands for Tax Lien, 05 stands for Support Debt, 06 stands for Bankruptcy, 07 stands for Garnishment, 08 stands for Repossession, 09 stands for Collection, 10 stands for Divorce Decree, 11 stands for Custody Agreement, 12 stands for Financing Statement (Secured Loan), 13 stands for Lien, 14 stands for Non-responsibility, 15 stands for Financial Counseling, 16 stands for Fictitious Name, 17 stands for Notice of Default, 18 stands for Forcible Detainer, 19 stands for Unlawful Detainer, 20 stands for an other Public Record or Obligation Type, and ZZ stands for a mutually defined code.

(iiiii) LocationID

A GDT LocationID 14800 is a unique identifier for a location. A location is a logical or a physical place. An example of GDT LocationID 14800 is:

```
<LocationID schemeID="myLocations"
        schemeAgencyID="065055766"
            schemeAgencySchemeID="DUNS"
            schemeAgencySchemeAgencyID="016">
    LOC_4711
</LocationID>.
```

In the above example, 065055766 is the DUNS number for Bosch, and 016 is the DUN & Bradstreet Corporation from code list UN/EDIFACT DE 3055.

The structure of GDT LocationID 14800 is depicted in FIG. 148. For GDT ID 14800, the Object Class is Location 14802, the Property is Indemnification 14804, the Representation/Association is Identifier 14806, the Type is CCT 14808, the Type Name is Identifier 14810, and the Length is twenty 14812. The GDT LocationID 14800 may be a restricted GDT.

For the scheme ID 14816, the Category is Attribute 14818, the Object Class is Identification Scheme 14820, the Property is Identification 14822, the Representation/Association is Identifier 14824, the Type is xsd 14826, the Type Name is Token 14828, and the Length is from zero to sixty 14830. The Cardinality is zero or one 14852.

For the scheme Agency ID 14834, the Category is Attribute 14836, the Object Class is Identification Scheme Agency 14838, the Property is Identification 14840, the Representation/Association is Identifier 14842, the Type is xsd 14844, the Type Name is Token 14846, and the Length is from zero to sixty 14850. The Cardinality is zero or one 14852.

For the Scheme Agency-Scheme ID 14854, the Category is Attribute 14856, the Object Class is Identification Scheme Agency 14858, the Property is Scheme 14860, the Representation/Association is Identifier 14862, the Type is xsd 14864, the Type Name is Token 14866, and the Length is thee 14868. The Cardinality is zero or one 14870.

For the Scheme Agency-Scheme Agency ID 14872, the Category is Attribute 14874, the Object Class is Identification Scheme Agency 14876, the Property is Scheme Agency 14878, the Representation/Association is Identifier 14880, the Type is xsd 14882, the Type Name is Token 14884, the Length is three 14886. The Cardinality is zero or one 14888.

For standardized and proprietary GDT LocationID 14800, there is the CDT: LocationStandardID and CDT: LocationPartyID.

(jjjjj) LocationInternalID

A CDT LocationInternalID 14900 is a proprietary identifier for a location. A location is a logical or a physical place. An example of CDT LocationInternalID 14900 is:

GUID of a location:

<LocationInternalID schemeID="LocationGUID" schemeAgencyID="MPL__002">1C743CEC501F6A4D8826C7EC5A8554B9</LocationInternalID>.

In the above example, schemeID="LocationGUID" indicates that the scheme "LocationGUID" was used to identify the location, and schemeAgencyID="MPL__002" indicates that the scheme was assigned by the business system "MPL__002."

The following is another example of LocationInternalID:

ID of a location:

<LocationInternalID schemeID="LocationID" schemeAgencyID="MPL__002">CU00000000001</LocationInternalID>.

The structure of CDT LocationInternalID 14900 is depicted in FIG. 149. For GDT Location Internal ID 14902, the Object Class is Location 14904, the Property is Internal 14906, the Representation/Association is Identifier 13308, the Type is GDT 14910, the Type Name is Location ID 14912, and the Length is from one to thirty-two 14914. The CDT LocationInternalID 14900 may be a restricted CDT.

For the scheme ID 14918, the Category is Attribute 14320, the Object Class is Identification Scheme 14920, the Property is Identification 14922, the Representation/Association is Identifier 14924, the Type is xsd 14926, the Type Name is Token 14928, the Length is from one to sixty 14930. The Cardinality is zero or one 14932.

For the scheme Agency ID 14934, the Category is Attribute A 14936, the Object Class is Identification Scheme Agency 14936, the Property is Identification 14938, the Representation/Association is Identifier 14940, the Type is xsd 14942, the Type Name is Token 14944, the Length is from one to sixty 14946. The Cardinality is zero or one 14948.

LocationGUID and Location ID are both schemes provided for schemeID. LocationGUID identifies a location using a Global Unique Identifier, and LocationID identifies a location using an identifier. SchemeAgencyID identifies a business system in which the identifier was assigned.

The CDT LocationInternalID represents a projection of the GDT LocationID, in which the attributes "schemeID" and "schemeAgencyID" are contained for describing an internally assigned ID. If an attribute is not explicitly assigned in the use of the CDT, it may be clearly specified through the context.

The CDT LocationInternalID 14900 is used when both sender and recipient can access shared master data.

(kkkkk) LocationPartyID

A CDT LocationPartyID 15000 is an identifier for a location assigned by a party. A location is a logical or a physical place. An example of CDT LocationPartyID 15000 is: <LocationBuyerID>4711</LocationBuyerID>.

The structure of CDT LocationPartyID 15000 is depicted in FIG. 150. For the CDT Location Party ID 15000, the Object Class is location 15002, the Property Quality is Party 15004, the Property is Identification 15006, the Representation/Association is Identifier 15008, the Type is GDT 15010, the Type Name is Location ID 15012, the Length is from one to twenty 15014. The CDT LocationPartyID 15000 may be a restricted CDT.

The PartyPartyID is the proprietary identifier assigned by a party. The party that assigned this identifier may derive from the context of the message that the LocationPartyID uses.

The CDT LocationPartyID 15000 represents a projection of the GDT LocationID, which may not contain attributes. In the XML instance, "Party" is replaced with "Partner Role Type" (e.g., LocationBuyerID, and the like). In contrast to LocationStandardID, the use of the CDT LocationPartyID 15000 is role-dependent (e.g., as an ID assigned by the Buyer). SchemeID and VersionID may be included as attributes to differentiate between several schemes.

(lllll) LocationStandardID

A CDT LocationStandardID 15100 is a standardized identifier for a location, whereby the identification scheme used is controlled by an agency from the code list DE 3055. A location is a logical or a physical place. An example of CDT LocationStandardID 15100 is:

```
<LocationStandardID
    schemeAgencyID="009">
4012345678910
</LocationStandardID>.
```

In the above example, 009 stands for EAN.UCC (International Article Numbering association) from the code list UN/EDIFACT DE 3055.

The structure of CDT LocationStandardID 15100 is depicted in FIG. 151. The CDT Location Standard ID 15100 includes attribute schemeAgencyID. For the CDT LocationStandardID 15100, the Object Class is Location 15102, Property Quality is Standard 15104, the Property is Identification 15106, the Representation/Assocation is Identifier 15108, the Type is GDT 15110, the Type Name is Location ID 15112, and the Length is thirteen 15114. The CDT LocationStandardID 15100 may be a restricted CDT.

For the Scheme Agency ID 15118, the Category is Attribute 15120, the Object Class is Identification Scheme Agency 15122, the Property is Identification 15124, the Representation/Assocation is Identifier 15126, the Type is xsd 15128, the Type Name is Token 15130, and the Length is three 15132. The Cardinality is one 15134. The schemeAgencyID 15118 identifies the agency that manages an identification scheme. The agencies from DE 3055 may be used as the default, but the roles defined in DE 3055 may not be used. In an embodiment, the supported codes are 009 (EAN.UCC) for the 13-character Global Location Number (GLN), and 116 (ANSI ASC X12) for the 13-character DUNS+4, an enhancement to DUNS (Data Universal Numbering System from Dun & Bradstreet) for location identification.

The CDT LocationStandardID 15100 represents a projection of the GDT LocationID, in which the attribute schemeAgencyID is contained. This indicates the standardization organization that assigned the ID.

In an embodiment, the attribute schemeAgencyID is a mandatory attribute. SchemeID and VersionID may be included as attributes to differentiate between several schemes.

(mmmmm) LogItem

A GDT LogItem 15200 is a log message that is generated when an application is executed. An example of GDT LogItem 15200 is:

```
<LogItem>
<TypeID>001(/CCM/)</TypeID>
<SeverityCode>3</SeverityCode>
<Note>Catalog CAMERAS could not be published</Note>
<WebAddress>http://pgwdf0123.sap.corp:12345/sap/ccm/
messagedetail&language=EN&id=001(/CCM/)&param1=CAMERAS
</WebAddress>
</LogItem>.
```

The structure of GDT LogItem 15200 is depicted in FIG. 152. The GDT LogItem 15200 includes elements TypeID, SeverityCode, Note, and WebAddress. For the GDT LogItem 15200, the Representation/Association is Details 15202. The GDT LogItemTypeID 15200 may not be confused with sequential numbering for the messages in a log. The GDT LogItemTypeID 15200 does not require the attributes to be listed for the CCT Identifier, since these are taken from the context.

TypeID is a unique identification of the type of a log entry (within the application that generates the log). For example, when a catalog is published, a log can be generated containing several items concerning the successful publication of a catalog item. Since these log entries may be similar, they all have the same TypeID, although the respective catalog items are inserted dynamically in a text pattern that corresponds to the message type. For the Type ID 15204, the Category is Element 15206, the Object Class is Log Item 15208, the Property is Type Identification 15210, the Representation/Association is Identifier 15212, the Type is CCT 15214, the Type Name is Identifier 15216, and the Length is from one to forty 15218. The Cardinality is zero or one 15220. The GDT LogItem 15200 may be a restricted 15222.

Severity Code is the severity of the log message. For the Severity Code, the Category is Element 15226, the Object Class is Log Item 15228, the Property is Severity 15230, the Representation/Association is Code 15232, the Type is GDT 15234, the Type Name is Log Item Severity Code 15236, and the Cardinality is zero or one 15238.

Note is a short text for the log message. The GDT LogItemNote 15200 restricts the length permitted in the GDT Note. For the Note 15240, the Category is Element 15242, the Object Class is Log Item 15244, the Property is Note 15246, the Representation/Association is Note 15248, the Type is GDT 15250, the Type Name is 15252, the Length is from one to two-hundred 15254. The Cardinality is one 15256. The Remarks may be restricted 15258.

WebAddress is the address for a document available on the Internet that contains more information about the log entry. For the Web Address, the Category is Element 15262, the Object Class is Log Item 15264, the Property is Web Address 15266, the Representation/Association is Web Address 15268, the Type is CCT 15270, the Type Name is Web Address 15272, and the Cardinality is zero or one 15274.

The URI schemas, for example "http" and "https," are permitted.

The use of the elements TypeID and WebAddress (with or without a specified language) may be optional depending on the business context. It may not be useful to use the SeverityCode for all types of log. The GDT LogItem 15200 can therefore be extended in the future by specifying an attack level, for instance, in the area of Internet security, or for user interaction in the area of e-learning.

In ABAP applications, the element TypeID corresponds to the combination of message class (also known as application area) and message number. These are listed consecutively in accordance with the pattern for the LogItemTypeID: <message number>(/<message class>/).

(nnnnn) LogItemSeverityCode

The GDT LogItemSeverityCode 15300 is the coded representation of the severity in a log message on the execution of an application. An example of GDT LogItemSeverityCode 15300 is: <SeverityCode>2</SeverityCode>.

The structure of GDT LogItemSeverityCode 15300 is depicted in FIG. 153. The GDT Log Item Severity Code 15300, the Object Class is Log Item 15302, the Property is Severity 15304, the Representation/Association Code is 15306, the Type is CCT 15308, the Type Name is Code 15310, and the Length is one 15312.

The GDT LogItemSeverityCode 15300 can have the values 1 through 4. 1 refers to a notification of the execution of an application or an application step if no errors or error possibilities have occurred. 2 refers to a warning of the possibility of an error or an error source in the execution of an application or an application step. 3 refers to a notification of the occurrence of an error during the execution of an application or an application step—for, example with a more precise description of the type of error. 4 refers to a notification of a premature or unforeseen termination of the execution of an application.

The values of the ServiceProcessingLogItemSeverityCode follow the UN/EDIFACT code list 0331 "Report function," with regard to naming and additional values. This code list also focuses on the dialog with a system.

The following linear order applies for the severity: 1<2<3<4. During the execution of an application, log messages may be created that are classified by the severity of the GDT LogItemSeverityCode 15300 (e.g., as an error message).

The ServiceProcessingLogItemSeverityCode may be a proprietary code list with fixed predefined values. Changes to the permitted values involve changes to the interface.

(ooooo) Measure

A GDT Measure 15400 is a physical measurement with the corresponding unit of measurement. An example of GDT Measure 15400 is: <NetWeightMeasure unitCode="KGM">420.5</NetWeightMeasure>, where KGM means kilogram.

The structure of GDT Measure 15400 is depicted in FIG. 154. The GDT Measure 15400 includes attribute unitCode 15410. For the GDT Measure 15400, the Representation/Association is Measure 15402, the Type is xsd 15404, the Type Name is decimal 15406, and the Length is maximum thirteen predecimal units and six decimal units 15408.

For the unitCode 15410, the Category is Attribute 15412, the Object Class is Measure 15414, the Property is Unit 15416, the Representation/Association is Code 15418, the Type is xsd 15420, the Type Name is token 15422, and the Length is from one to three 15424. The Cardinality is one 15426.

GDT Measure 15400 is the result of the measurement of a physical size in relation to a standard size, which may be the standard against which everything else is measured. Positive and negative entries are possible by using the built-in data type "xsd:decimal." Negative entries may be prefixed with a negative sign ("–"). Positive entries do not have to be prefixed with a positive sign ("+").

GDT Measure 15400 can be used to specify physical business sizes. Examples of such measurements are the height, width, length, weight, and volume of a handling unit, or the latitude or longitude of a geographic location.

(ppppp) MeasureUnitCode

The GDT MeasureUnitCode 15500 is the coded representation of a non-monetary unit of measurement. A unit of measurement is, for example, a quantity that is either defined by a standard or established by conventions as a particular type of unit. This unit quantity may be the standard of comparison for determining and specifying other quantities of the same type. An example of GDT MearureUnitCode 15500 is: <MeasureUnitCode>BX</MeasureUnitCode>, where BX stands for box.

The structure of GDT MeasureUnitCode 15500 is depicted in FIG. 155. The GDT Measure Unit Code 15500, the Object Class is Measure Unit 15502, the Representation/Association is Code 15504, the Type is xsd 15506, the Type Name is token 15508, and the Length is from one to three 15510.

The permitted values for GDT MeasureUnitCode 15500 are the "Common Codes" specified in UN/CEFACT Recommendation #20. The Common Code is a sequence of a maximum of three alphanumerical characters. The recommendation is divided into three levels. Each unit belongs to a level. Levels 1 and 2 contain physical units: level 1 contains SI units and level 2 contains SI-equivalent units. Level 3 contains other "informative" units of measurement that are not assigned to level 1 or 2.

In particular, UN/CEFACT Recommendation #20 contains codes for physical units (Physical Measure Units) such as meters, kilograms, or seconds and units that derive from them such as cubic meters, hours, and Newtons, as well as country-specific and industry-specific physical units.

A distinction may be made between Common Code and the representation symbol of a unit. A standardized representation symbol may be available.

(qqqqq) MeasureUnitMeaningCode

The GDT MeasureUnitMeaningCode 15600 is a coded representation of the meaning of a physical unit of measurement. An example of GDT MeasureUnitMeaningCode 15600 is:

<MeasureUnitMeaningCode>E17</MeasureUnitMeaningCode>.

The structure of GDT MeasureUnitMeaningCode 15600 is depicted in FIG. 156. The GDT Measure Unit Meaning Code 15600, the Object Class is Measure Unit 15602, the Property is Meaning 15604, the Representation/Association is Code 15606, the Type is CCT 15608, the Type Name is Code 15610, and the Length is three 15612. The GDT MeasureUnitMeaningCode 15600 may be restricted.

The possible values may be taken from the IEC61360 standard. For example, the unit kA/m can be derived in different ways and describes different properties, such as longitudinal currents, magnetic field strength, or magnetization.

(rrrrr) MessageTypeCode

The GDT MessageTypeCode 15700 is a coded representation of the (business) type of a message. A message type describes the nature of (business) messages of the same kind. An example of GDT MessageTypeCode 15700 is: <MessageTypeCode>0101</MessageTypeCode>.

The structure of GDT MessageTypeCode 15700 is depicted in FIG. 157. For the GDT Message Type Code 15700, the Object Class is Message 15702, the Property is Type Code 15704, the Representation/Association is Code 15706, the Type is CCT 15708, the Type Name is Code 15710, and the Length is four 15712. The GDT MessageTypeCode 15700 may be a restricted GDT.

The permitted values for the GDT MessageTypeCode 15700 are described in the table below.

| Code | Name | Description |
|---|---|---|
| 0060 | PurchaseContractLegalDocument Request | A PurchaseContractLegalDocumentRequest is a request from Purchase Contract Management to Document Builder to create from purchase contract data a contract text conforming to legal standards. |
| 0061 | PurchaseContractLegalDocument Notification | A PurchaseContractLegalDocumentNotification is a notification from Document Builder to Purchase Contract Management about a legal contract. |
| 0062 | PurchaseContractUseRequest | A PurchaseContractUseRequest is a request from Purchase Contract Management to Purchasing to use the transmitted purchase contract or to take into account transmitted changes of the purchase contract. |
| 0063 | PurchaseContractUseConfirmation | A PurchaseContractUseConfirmation is a confirmation from Purchasing to Purchase Contract Management about the use or change, respectively, of a transmitted purchase contract. |
| 0064 | PurchaseContractReleaseNotification | A PurchaseContractReleaseNotification is a notification from Purchasing to Purchase Contract Management about a purchase contract release. |
| 0077 | SourceOfSupplyNotification | A SourceOfSupplyNotification is a notice to Supply Chain Planning about available sources of supply. |

-continued

| Code | Name | Description |
|---|---|---|
| 0080 | CatalogueUpdateNotification | A CatalogueUpdateNotification is a notice from a catalogue provider to an interested party about a new catalogue transmitted in the message or about changes to an existing catalogue transmitted in the message. |
| 0081 | CataloguePublicationRequest | A CataloguePublicationRequest is a request from catalogue authoring to the Catalogue Search Engine (the publishing system) to publish a new or changed catalogue or to delete an already published catalogue (the catalogue is possibly split into several transmission packages). |
| 0082 | CataloguePublicationTransmission PackageNotification | A CataloguePublicationTransmissionPackage notification is the notification of the Catalogue Search Engine (the publishing system) to Catalogue Authoring about a package of a catalogue publication transmission and information about the reception of this package and the validity of its content. |
| 0083 | CataloguePublicationConfirmation | A CataloguePublicationConfirmation is the confirmation of the Catalogue Search Engine (the publishing system) to the Catalogue Authoring whether the publication or deletion of a Catalogue requested by a CataloguePublicationRequest was successful or not. |
| 0084 | CataloguePublicationTransmission CancelationRequest | A CataloguePublicationTransmissionCancellation equest is the request of Catalogue Authoring to Catalogue Search Engine (the publishing system) to cancel the transmission of a Catalogue and to restore an earlier published state (if such exists) of the Catalogue. Moreover, no more packages are sent for this transmission. |
| 0085 | CataloguePublicationTransmission CancelationConfirmation | A CataloguePublicationTransmissionCancellation onfirmation is the confirmation of Catalogue Search Engine (the publishing system) whether the transmission of a Catalogue has been cancelled successfully and an earlier published state of this catalogue (if such exists) has been restored or not. |
| 0086 | CataloguePublicationTransmission ItemLockRequest | A CataloguePublicationTransmissionItemLock equest is the request of Catalogue Authoring to lock single items of the catalogue contained in the catalogue publication transmission. |
| 0087 | CataloguePublicationTransmission ItemLockConfirmation | A CataloguePublicationTransmissionItemLock confirmation is the confirmation of Catalogue Search Engine (the publishing system) to Catalogue Authoring whether single items of the catalogue contained in the catalogue publication transmission could be locked or not.<br>To lock means: If the catalogue is not yet published the items must not be published. If the catalogue is already published, the publication of these items must be revoked. |
| 0101 | PurchaseOrderRequest | A PurchaseOrderRequest is a request from a purchaser to a seller to deliver goods or provide services. |
| 0102 | PurchaseOrderChangeRequest | A PurchaseOrderChangeRequest is a change to a purchaser's request to the seller to deliver goods or provide services. |
| 0103 | PurchaseOrderCancellationRequest | A PurchaseOrderCancellationRequest is the cancellation of a purchaser's request to the seller to deliver goods or provide services. |
| 0104 | PurchaseOrderConfirmation | A PurchaseOrderConfirmation is a confirmation, partial confirmation, or change from a seller to the purchaser, regarding the requested delivery of goods or provision of services. |
| 0120 | PurchaseOrderInformation | A PurchaseOrderInformation is information from a purchasing system for interested recipients about the current state of a purchase order when making, changing, confirming, or cancelling a purchase order. |
| 0121 | PurchaseOrderPlanningNotification | A PurchaseOrderPlanningNotification is a message by means of which planning applications are notified about those aspects of a purchase order that are relevant for planning. |
| 0130 | PurchaseRequirementRequest | A PurchaseRequirementRequest is a request from a requestor to a purchaser to (externally) procure products (materials, services) (external procurement). |
| 0131 | PurchaseRequirementConfirmation | A PurchaseRequirementConfirmation is a notice from the purchaser to the requestor about the degree of fulfillment of a requirement. |

-continued

| Code | Name | Description |
|---|---|---|
| 0140 | ProductDemandInfluencingEvent Notification | A ProductDemandInfluencingEventNotification is a notification about an event that influences the supply or demand of products. |
| 0141 | ProductForecastNotification | A ProductForecastNotification is a notification about future product supply or demand (forecasts). |
| 0142 | ProductForecastRevisionNotification | A ProductForecastRevisionNotification is a notification about the revision of future product supply or demand (forecasts). |
| 0145 | ProductActivityNotification | A ProductActivityNotification is a notice from a buyer to a vendor about product-related activities. Based on this, the vendor can perform supply planning for the buyer. |
| 0151 | RFQRequest | An RFQRequest is the request from a purchaser to a bidder to participate in a request for quotation for a product. |
| 0152 | RFQChangeRequest | An RFQChangeRequest is a change to the purchaser's request to a bidder to participate in the request for quotation for a product. |
| 0153 | RFQCancellationRequest | An RFQcancellationRequest is a cancellation by the purchaser of a request for quotation for a product. |
| 0154 | RFQResultNotification | An RFQResultNotification is a notification by a purchaser to a bidder about the type and extent of the acceptance of a quote or about the rejection of the quote. |
| 0155 | Quote Notification | A QuoteNotification is the quote of a bidder communicated to a purchaser concerning the request for quotation for a product by the purchaser. |
| 0160 | SalesOrderFulfillmentRequest | A SalesOrderFulfillmentRequest is a request (or change and cancellation of such a request) from a selling component to a procuring component, to fulfill the logistical requirements (available-to-promise check, scheduling, requirements planning, procurement, delivery, . . . ) of a sales order. |
| 0161 | SalesOrderFulfillmentConfirmation | A SalesOrderFulfillmentConfirmation is a confirmation, partial confirmation, or change from the procuring component to the selling component, regarding a sales order with respect to which procurement has been requested. |
| 0185 | OrderIDAssignmentNotification | An OrderIDAssignmentNotification is a notice from a buyer to a vendor that contains order IDs to be used by the latter for identifying "purchase orders generated by the vendor". |
| 0200 | DeliveryExecutionRequest | A DeliveryExecutionRequest is a request to a warehouse or supply chain execution to prepare and execute the outbound delivery of goods or the acceptance of an expected or announced inbound delivery. |
| 0201 | DeliveryInformation | A DeliveryInformation is a notice about the creation, change, and execution status of a delivery. |
| 0202 | DespatchedDeliveryNotification | A DespatchedDeliveryNotification is a notification communicated to a product recipient about the planned arrival, pickup, or issue date of a ready-to-send delivery, including details about the content of the delivery. |
| 0203 | ReceivedDeliveryNotification | A ReceivedDeliveryNotification is a notification communicated to a vendor about the arrival of the delivery sent by him to the product recipient, including details about the content of the delivery. |
| 0206 | ReturnDeliveryInstructionNotification | A ReturnDeliveryInstructionNotification is a notice to a vendor which contains instructions for the return delivery to be executed by him. |
| 0210 | DeliveryScheduleNotification | A DeliveryScheduleNotification is the notification to a vendor about the quantity of a product to be delivered with a certain liability at a certain date in accordance with a given scheduling aggreement between buyer and vendor. |
| 0213 | VendorGeneratedOrderNotification | A VendorGeneratedOrderNotification is a notification to a customer/buyer about a replenishment order initiated and planned by a vendor/seller so that the former can create a corresponding purchase order. |
| 0214 | VendorGeneratedOrderConfirmation | VendorGeneratedOrderConfirmation is the confirmation from a customer/buyer that a purchase order has been created for the replenishment order initiated and planned by his vendor/seller. |

-continued

| Code | Name | Description |
|---|---|---|
| 0216 | Replenishment Order Notification | A ReplenishmentOrderNotification is a notification from Logistics Planning (SCP, vendor) to Logistics Execution (SCE, vendor) about a replenishment order planned for a customer/buyer in order to trigger further processing for the order and prepare the outbound delivery. |
| 0217 | ReplenishmentOrderConfirmation | A ReplenishmentOrderConfirmation is a confirmation from Logistics Execution (SCE, vendor) to Logistics Planning (SCP, vendor) that a replenishment order that is planned for a customer/buyer can be fulfilled. |
| 0235 | CustomsVendorDeclarationComplete Request | A CustomsVendorDeclarationCompleteRequest is the request a buyer makes to a vendor to complete a long-term vendor declaration for customs purposes. |
| 0236 | CustomsVendorDeclarationNotification | A CustomsVendorDeclarationNotification is a notification from a vendor to inform a buyer of a long-term vendor declaration for customs purposes. A vendor declaration refers to goods that are delivered from the vendor to the buyer. |
| 0240 | ServiceAcknowledgementRequest | A ServiceAcknowledgementRequest is a request by a seller to a purchaser to confirm the services recorded. |
| 0241 | ServiceAcknowledgementConfirmation | A ServiceAcknowledgementConfirmation is a confirmation (or rejection) of the services recorded. |
| 0250 | InventoryChangeNotification | An InventoryChangeNotification is a notice with detailed information about inventory changes in inventory management, which is used, e.g., by logistics planning. |
| 0251 | InventoryChangeAccounting Notification | An InventoryChangeAccountingNotification is a notice with aggregated information about inventory changes in inventory management, which is tailored to financials. |
| 0252 | InventoryChangeAccounting CancellationRequest | An InventoryChangeAccountingCancellationRequest is a request for the full cancellation of posting information previously sent to financials with respect to a goods movement. |
| 0290 | BillingDueNotification | A BillingDueNotification is a notification about billing-relevant data communicated to an application in which the subsequent operative processing of billing takes place. |
| 0291 | InvoicingDueNotification | An InvoicingDueNotification is a notification about invoicing-relevant data communicated to an application in which the operative verification and creation of invoices takes place, and/or in which "self billing" invoices (evaluated receipt settlement) are created. |
| 0292 | BillingDueCancellationRequest | A BillingDueCancellationRequest is a request for the full cancellation of a BillingDueNotification previously sent to billing. |
| 0293 | InvoicingDueCancellationRequest | An InvoicingDueCancellationRequest is a request for the full cancellation of a InvoicingDueNotification previously sent to invoice verification. |
| 0401 | InvoiceRequest | An InvoiceRequest is a legally binding notice about accounts receivable or accounts payable for delivered goods or provided services - typically a request that payment be made for these goods or services. |
| 0402 | InvoiceConfirmation | An InvoiceConfirmation is the respose of a recipient of an invoice to the bill-from-party by which the invoice as a whole is confirmed, rejected, or classified as 'not yet decided'. |
| 0409 | SupplierInvoiceInformation | A SupplierInvoiceInformation is an information from Invoicing about an accepted supplier invoice or its cancelation. |
| 0410 | InvoiceIssuedInformation | An InvoiceIssuedInformation contains information on the following:<br>Which items of an invoice have been billed<br>Which rendered services, delivered products, or credit or debit memo request items have been billed<br>The extent to which the above items have been billed. |
| 0411 | InvoiceAccountingNotification | An InvoiceAccountingNotification is a notification tailored to financials about incoming or outgoing invoices. |
| 0412 | InvoiceAccountingCancellation Request | An InvoiceAccountingCancellationRequest is a request for the full cancellation of posting information previously sent to financials, regarding an incoming or outgoing invoice or credit memo. |

-continued

| Code | Name | Description |
|---|---|---|
| 0420 | TaxDueNotification | A TaxDueNotification is a notice from tax determination and calculation to the tax register of a company about data relevant for tax reports and tax payments. |
| 0421 | VATDeclarationRequest | A VATDeclarationRequest is a request to a tax authority to handle a tax return for tax on sales/purchases. |
| 0422 | VATDeclarationConfirmation | A VATDeclarationConfirmation is a confirmation about the receipt, completeness, formal correctness and, if necessary, consistency of a tax return for tax on sales/purchases. |
| 0426 | SupplierInvoiceCancellationExecution Request | A SupplierInvoiceCancellationExecutionRequest is request to execute the cancellation of a supplier invoice. |
| 0427 | SupplierInvoiceSettlementRelease Request | A SupplierInvoiceSettlementReleaseRequest is the request to release an accepted supplier invoice for settlement. |
| 0430 | PaymentDueNotification | A PaymentDueNotification is a notification about due payments (accounts receivable and accounts payable). |
| 0450 | CreditAgencyReportQuery | A CreditAgencyReportQuery is an inquiry to a credit agency concerning the credit report for a business partner. |
| 0451 | CreditAgencyReportResponse | A CreditAgencyReportResponse is a response from a credit agency concerning the inquiry about the credit report for a business partner. |
| 0452 | CreditWorthinessQuery | A CreditWorthinessQuery is an inquiry to credit management concerning the credit worthiness of a business partner. |
| 0453 | CreditWorthinessResponse | A CreditWorthinessResponse is a response from credit management concerning the inquiry about the credit worthiness of a business partner. |
| 0454 | CreditWorthinessChangeInformation | A CreditWorthinessChangeInformation is information about changes of the credit worthiness of a business partner. |
| 0455 | CreditCommitmentQuery | A CreditCommitmentQuery is an inquiry from credit management concerning existing payment obligations of a business partner. |
| 0456 | CreditCommitmentResponse | A CreditCommitmentResponse is a response concerning an inquiry from credit management about existing payment obligations of a business partner. |
| 0457 | CreditCommitmentRecordNotification | A CreditCommitmentRecordNotification is a notice to credit management about existing payment obligations of business partners. |
| 0458 | CreditWorthinessCriticalParties Query | A CreditWorthinessCriticalPartiesQuery is an inquiry to credit management about business partners, for which the credit worthiness has been rated as critical. |
| 0459 | CreditWorthinessCriticalParties Response | A CreditWorthinessCriticalPartiesResponse is a response from credit management concerning an inquiry about business partners, for which the credit worthiness has been rated as critical. |
| 0460 | CreditPaymentBehaviourSummary Notification | A CreditPaymentRecordNotification is a notification to credit management about the payment behavior (payments made, open items, dunning notices) of a business partner. |
| 0601 | PersonnelTimeSheetInformation | A PersonnelTimeSheetInformation is a notice to personnel time management.about personnel times and personnel time events recorded by an upstream personnel time recording system. |

Message types may be collected in this code list.

(sssss) Name

A GDT Name 15800 is a word or word combination used to name or identify an object. An example of GDT Name 15800 is: <ProductName>NW Feezer SJ-450</ProductName>.

The structure of GDT Name 15800 is depicted in FIG. 158. For the GDT Name 15800, the Object Class is 15802, the Representation/Association is Text 15804, the Type is CCT 15806, and the Type Name is Text 15808.

For the Language Code 15810, the Category is Attribute 15812, the Object Class is Name 15814, the Property is Language Code 15816, the Representation/Association Code 15818, the Type is xsd 15820, the Type Name is Language 15822, the Length is from two to five 15824, and the Cardinality is zero or one 15826. GDT Name 15800 is from the Core Component Type "Text."

The GDT Name 15800 can be language-specific. If the name is language-specific, the attribute "languageCode" can be used to determine the relevant language of the name according to RFC 3066.

GDT Name 15800 may be used for the object label that is typically used in a natural language context. This may be the name of a person, location, service or product, for example.

The GDT Name 15800 can be language-specific. For example, an object can have a different name in different languages. In this case, the language may be specified using the "languageCode" attribute.

(ttttt) Note

A GDT Note 15900 is a brief communication, the language of which is not explicitly specified. An example of GDT Note 15900 is: <DocumentNote>Order 04.04.2002</DocumentNote>.

The structure of GDT Note 15900 is depicted in FIG. 159. For the GDT Note 15900, the Property is Note 15902, the Representation/Association is Text 15904, the Type is CCT 15906, and the Type Name is Text 15908. The GDT Note 15900 may be a restricted GDT. GDT Note 15900 is from the Core Component Type "Text":

GDT Note 15900 may be used to title or briefly describe a complex object. In an embodiment, GDT Note 15900 may not be used as a placeholder when there is no other appropriate global type for an individual element. GDT Note 15900 may not have its own language. Either the language is known from the context or GDT Note 15900 is language-independent.

(uuuuu) ObjectStructureRelationshipTypeCode

The GDT ObjectStructureRelationshipTypeCode 16000 is a coded representation of the type of a business relationship between objects of the same object type, and is used to create structures (hierarchies or networks) on these objects. An example of GDT ObjectStructureRelationshipTypeCode 16000 is:
<ObjectStructureRelationshipTypeCode>001</ObjectStructureRelationshipTypeCode>.

The structure of GDT ObjectStructureRelationshipTypeCode 16000 is depicted in FIG. 160. The GDT Object Structure Relationship Type Code 16000, the Object Class is Object Structure Relationship 16002, the Property is Type Code 16004, the Representation/Association is Code 16006, the Type is CCT 16008, the Type Name is Code 16010, and the Length is three 16012. The GDT ObjectStructureRelationshipTypeCode 16000 may be a restricted GDT.

ObjectStructureHierarchyRelationshipTypeCode can have the values 001 through 006. 001 means the relationship is a bill of materials relationship. 002 means the relationship is a grouping relationship. The object involved in this relationship is part of a logical grouping to the other object. 003 means the relationship is a discount-in-kind relationship. 004 means the relationship is a spare-part relationship. 005 means the relationship is an accessories relationship. 006 means the relationship is a substitute-product relationship.

GDT ObjectStructureRelationshipTypeCode 16000 is used for typing relationships between objects of a single object type, for example, relationships between products (e.g., a spare-part relationship), relationships between (document) items (e.g., a discount-in-kind relationship), or relationships between project plans.

The typing of relationships between objects of different object types may not be covered by this GDT. This includes relationships between a product and a business document, between a marketing plan and a marketing campaign, between a business document and an item of a document, or between a project plan and a project plan element.

Furthermore, the GDT ObjectStructureRelationshipTypeCode 16000 may be restricted to the typing of relationships from a purely business perspective. In an embodiment, technical typings (e.g., "implemented by" or "generated from") may not be covered.

(vvvvv) OrdinalNumberValue

A GDT OrdinalNumberValue 16100 is a number that indicates the position of an element in a linearly ordered set that is ordered according to particular factors. An example of GDT OrdinalNumberValue 16100 is: <OrdinalNumberValue>4</OrdinalNumberValue>.

The structure of GDT OrdinalNumberValue 16100 is depicted in FIG. 161. The GDT Ordinal Number Value 16100, the Representation/Assocation Quality is Ordinal Number 16102, the Representation/Association is Value 16104, the Type is xsd 16106, the Type Name is Positive Integer 16108, an the Length is from one to nine 16110.

Positive, whole numbers smaller than one billion are permitted. GDT OrdinalNumberValue 16100 may be used in a catalog to specify the order of characteristics in a list of characteristics.

(wwwww) PartialDelivery

A GDT PartialDelivery 16200 is the maximum number of partial deliveries that may/can be carried out to deliver the ordered quantity of an item. An example of GDT PartialDelivery 16200 is:

```
<PartialDelivery>
     <MaximalNumber>
          9
     <\MaximalNumber>
<\ PartialDelivery >.
```

The structure of GDT PartialDelivery 16200 is depicted in FIG. 162. For the GDT Partial Delivery 16200, the Object Class is Partial Delivery 16202 and the Representation/Association is Details 16204.

For Category Element 16206, the Object Class is Partial Delivery 16208, the Property is Maximal Number 16210, the Representation/Association is Integer 16212, the Type is GDT 16214, the Type Name is Integer Value 16216, the Length is one 16218. The Cardinality is zero or one 16220. For Category Element 16206, zero not allowed 16222. A length of 1 in the MaximalNumber field means that a maximum of up to 9 partial deliveries will be accepted to fulfill the ordered quantity. The specification is made as a whole number without any plus/minus sign (e.g., 9). No entry in this field means that complete delivery is wanted and no partial delivery is allowed even if the Unlimitedindicator is not set.

For Category Element 16224, the Object Class is Partial Delivery 16226, the Property is Unlimited Indicator 16228, the Representation/Association is Indicator 16230, the Type is GDT 16232, the Type Name is Value Unlimited Indicator 16234, and the Length is one 16236. The Cardinality is zero or one 16238. The UnlimitedIndicator can have the values 1 (true) or 0 (false). True means that a number of partial deliveries will be accepted. False means that a number of partial deliveries will not be accepted. The fields MaximalNumber and UnlimitedIndicator are mutually exclusive, i.e., entering "true" or "1" in the UnlimitedIndicator and simultaneously making an entry in Number is not logical.

PartialDelivery comprises two child elements, Number from the CCT: Numeric and UnlimitedIndicator from the CCT: Indicator.

GDT PartialDelivery 16200 indicates the maximum number of partial deliveries (including the first delivery) that may be performed to deliver the ordered quantity of an item.

(xxxxx) PartyID

A GDT PartyID 16300 is a unique identifier for a party. A party is a natural person, organization, or group in which a company has a business or intra-enterprise interest. This could be a person, organization, or group within or outside of the company. An example of GDT PartyID 16300 is:

EXAMPLE 1

Standard ID, Standard Agency

```
<PartyID    schemeID="DUNS"
            schemeAgencyID="016">
       065055766
</PartyID>
065055766 = Bosch at DUNS
016 = DUNS from Code List DE 3055
Example 2: Proprietary ID, Proprietary Agency
<PartyID    schemeID="PartyID"
            schemeAgencyID="BPL_300">
            schemeAgencySchemeAgencyID="ZZZ">
       4711
</PartyID>.
```

In the above examples, 4711 refers to the business partner in system BPL_300 with SAP CMDMm and ZZZ refers to a proprietary agency from Code List DE 3055.

The structure of GDT PartyID 16300 is depicted in FIG. 163. The GDT PartyID 16300 includes attributes schemeID 16316, schemeAgencyID 16334, schemeAgencySchemeID 16352, and schemeAgencySchemeAgencyID 16370. For the GDT PartyID 16300, the Object Class is Party 16302, the Property is Identification 16304, the Representation/Association term is Identifier 16306, the Type term is CCT 16308, the Type Name term is Identifier 16310, and the Length is from one to sixty 16312. The GDT PartyID 16300 may be a restricted GDT.

For the schemeID 16316, the Category is Attribute 16318, the Object Class is IdentificationScheme 16320, the Property tem is Identification 16322, the Representation/Association term is Identifier, the Type term is xsd 16326, the Type Name term is Token 16328, and the Length is from one to sixty 16330. The Cardinality between the GDT PartyID 16300 and the schemeID 16316 is zero or one 16332.

For the schemeAgencyID 16334, the Category is Attribute 16336, the Object Class is IdentificationSchemeAgency 16338, the Property is Identification 16340, the Representation/Association term is Identifier 16342, the Type term is xsd 16344, the Type Name term is Token 16346, and the Length is from one to sixty 16348. The Cardinality between the GDT PartyID 16300 and the schemeAgencyID 16334 is zero or one 16350.

For the schemeAgencySchemeID 16352, the Category is Attribute 16354, the Object Class is IdentificationSchemeAgency 16356, the Property is Scheme 16358, the Representation/Association term is Identifier 16360, the Type term is xsd 16362, the Type Name term is Token 16364, and the Length is from one to sixty 16366. The Cardinality between the GDT PartyID 16300 and the schemeAgencySchemeID 16352 is zero or one 16368.

For the schemeAgencySchemeAgencyID 16370, the Category is Attribute 16372, the Object Class is IdentificationSchemeAgency 16374, the Property is SchemeAgency 16376, the Representation/Association term is Identifier 16378, the Type term is xsd 16380, the Type Name term is Token 16382, and the Length is three 16384. The Cardinality between the GDT PartyID 16300 and the schemeAgencySchemeAgencyID 16370 is zero or one 16386.

The definition of the GDT PartyID 16300 includes persons, organizations, and party groups. The name GDT PartyID 16300 was intentionally chosen instead of BusinessPartnerID in order to be able to use the GDT for parties in which there is no direct business interest (e.g., employees' partners or children). The GDT is intended to cover roles which a party might assume. IDs that identify a party are permitted. IDs that identify a location may not be permitted.

GDT PartyID 16300 is used for software representation of a natural person, a legal person (organization), or a grouping of natural persons, legal persons, and their groupings (business partner group). The different roles of a party (e.g., Buyer, Vendor, Supplier) can be used in accordance with the UBL standard to enhance element names (e.g., BuyerPartyID).

(yyyyy) PartyInternalID

A CDT PartyInternalID 16400 is a proprietary identifier for a party. A party is a natural person, organization, or group in which a company has a business or intra-enterprise interest. This could be a person, organization, or group within or outside of the company. An example of a GUID of a party is:

<PartyInternalID schemeID="PartyGUID"schemeAgencyID="MPL__002">1C743CEC501F6A4D8826C7EC5A8554B9</PartyInternalID>

In the example, schemeID="PartyGUID" indicates that the scheme "PartyGUID" was used to identify the party, and schemeAgencyID="MPL__002" indicates that the scheme was assigned by the business system "MPL__002."

The following is an example of a party ID of a party:

<PartyInternalID schemeID="PartyID"schemeAgencyID="MPL__002">4711</PartyInternalID>.

The structure of CDT PartyInternalID 16400 is depicted in FIG. 164. The CDT PartyInternalID 16400 includes attributes schemeID 16418 and schemeAgencyID 16436. For the CDT PartyInternalID 16400, the Object Class is Party 16402, the Property Qualifier term is Internal 16404, the Property is Identification 16406, the Representation/Association term is Identifier 16408, the Type term is GDT 16410, the Type Name term is PartyID 16412, and the Length is from one to thirty-two 16414. The CDT PartyInternalID 16400 may be a restricted CDT.

For the schemeID 16418, the Category is Attribute 16420, the Object Class is IdentificationScheme 16422, the Property is Identification 16424, the Representation/Association term is Identifier 16426, the Type term is xsd 16428, the Type Name term is Token 16430, and the Length is from one to sixty 16432. The Cardinality between the CDT PartyInternalID 16400 and the schemeID 16418 is zero or one 16434.

For the schemeAgencyID 16436, the Category is Attribute 16438, the Object Class is IdentificationSchemeAgencyID 16440, the Property is Identification 16442, the Representation/Association term is Identifier 16444, the Type term is xsd 16446, the Type Name term is Token 16448, and the Length is from one to sixty 16450. The Cardinality between the CDT PartyInternalID 16400 and the schemeAgencyID 16436 is zero or one 16452.

PartyGUID and PartyID are schemes provided for scheme ID. PartyGUID identifies a party via a Global Unique Identifier, and PartyID identifies a party via an identification number. ShemeAgencyID identifies a business system in which the identifier was assigned.

The CDT PartyInternalID 16400 represents a projection of the GDT "PartyID," in which the attributes "schemeID" and "schemeAgencyID" are contained for describing an internally assigned ID. If an attribute is not explicitly assigned in the use of the CDT, it may be determined through the context.

The CDT PartyInternalID 16400 is used when both sender and recipient can access shared master data, e.g., during internal communication.

(zzzzz) PartyPartyID

A CDT PartyPartyID 16500 is an identifier for a party assigned by a party. A party is a natural person, organization, or group in which a company has a business or intra-enterprise interest. This could be a person, organization, or group within or outside of the company. An example is:

<BuyerPartySellerID>ABC</BuyerPartySellerID>

(the ID assigned by the seller for the Buyer).

The structure of CDT PartyPartyID 16500 is depicted in FIG. 165. For the CDT PartyPartyID 16500, the Object Class is Party 16502, the Property Qualifier term is Party 16504, the Property is Identification 16506, the Representation/Association term is Identifier 16508, the Type term is GDT 16510, the Type Name term is PartyID 16512, and the Length is from one to sixty 16514. The CDT PartyPartyID 16500 may be a restricted CDT.

The CDT PartyPartyID 16500 is the proprietary identifier assigned by a party. The party (in its role) that assigned this identifier may derive from the context of the message that the CDT PartyPartyID 16500 uses. The CDT PartyPartyID 16500 limits the general identifier PartyID. In contrast to "PartyStandardID," the use of the "PartyPartyID" is role-dependent (e.g., as an ID assigned by the Buyer). The party that assigns the ID is indicated by its role. The "Party" is replaced with the "partner role type" (e.g., PartySellerID). The SchemeID and schemeVersionID may be included as attributes to differentiate between several schemes. (See also PartyID and PartyStandardID).

(aaaaaa) PartyStandardID

A CDT PartyStandardID 16600 is a standardized identifier for a party, and the identification scheme used is controlled by an agency from the code list DE 3055. A party is a natural person, organization, or business partner group in which a company has a business or intra-enterprise interest. This could be a person, organization, or group within or outside of the company. An example is:

```
<BuyerParty>
    ...
    <StandardID schemeAgencyID="016">123456789</PartyStandardID>
    ...
</BuyerParty>
(the standardID assigned for the buyer).
```

The structure of PartyStandardID is depicted in FIG. 166. The CDT PartyStandardID 16600 includes attribute schemeAgencyID 16618. For the CDT PartyStandardID 16600, the Object Class is Party 16602, the Property Qualifier term is Standard 16604, the Property is Identification 16606, the Representation/Association term is Identifier 16608, the Type term is GDT 16610, the Type Name term is PartyID 16612, and the Length is from one to thirteen. The CDT PartyStandardID 16600 may be a restricted CDT.

For the schemeAgencyID 16618, the Category is Attribute 16620, the Object Class is IdentificationSchemeAgency 16622, the Property is Identification 16624, the Representation/Association term is Identifier 16626, the Type term is xsd 16628, the Type Name term is Token 16630, and the Length is three 16632. The Cardinality between the CDT PartyStandardID 16600 and the schemeAgencyID 16618 is one 16634.

The attribute 'schemeAgencyID' can contain values from the code list DE 3055. The codes which are supported for schemeAgencyID are: 1) 009 (EAN.UCC) for the 13-character Global Location Number (GLN); 2) 016 (Dun&Bradstreet Corporation) for the 9-character DUNS (Data Universal Numbering System); and 3) 182 (US, Standard Carrier Alpha Code (Motor) Organization) for the 2-to-4-character SCAC (Standard Carrier Alpha Code).

CDT PartyStandardID 16600 limits the general identifier PartyID to standard identifiers, whose scheme was assigned by a standardization organization from code list DE 3055. IDs that identify a party are permitted. IDs that identify a location may not be permitted. In contrast to PartyPartyID, use of CDT PartyStandardID 16600 is not role dependent. See also PartyID and PartyPartyID.

(bbbbbb) PaymentCard

A GDT PaymentCard 16700 is an identification card that authorizes the holder to settle invoices without cash with contract companies connected to the payment system. An example is:

```
CreditCard VISA:
<PaymentCard>
    <ID schemeAgencyID="XYZ" schemeAgencySchemeID="9362"
schemeAgencySchemeAgencyID="5">5555222200008888</ID>
    <ReferenceID>8765432</ReferenceID>
    <SequenceID>01</SequenceID>
    <HolderName>Mayermann</HolderName>
    <ExpiryDate>2005-05-31</ExpiryDate>
</PaymentCard>
CustomerCard IKEAGold:
<PaymentCard>
    <ID schemeID="IKEAGold" schemeAgencyID="124224"
schemeAgencySchemeID="DUNS"
schemeAgencySchemeAgencyID="16">
        AEIBDEFXXXX
    </ID>
    <ReferenceID>8765432</ReferenceID>
    <HolderName>Mayermann</HolderName>
    <ExpiryDate>2005-05-31</ExpiryDate>
</PaymentCard>.
```

The structure of GDT PaymentCard 16700 is depicted in FIG. 167. The GDT PaymentCard 16700 includes elements ID 16706, ReferenceID 16722, SequenceID 16740, Holder 16760, and ExpirationDate 16778. For the GDT Payment Card 16700, the Object Class is Payment Card 16702, and the Representation/Association term is Details 16704.

The ID is an unique identifier for a payment card. For the ID 16706, the Category is Element 16708, the Object Class is Payment Card 16710, the Property is Identification 16712, the Representation/Association term is Identifier 16714, the Type term is GDT 16716, and the Type Name term is PaymentCardID 16718. The Cardinality between the GDT PaymentCard 16700 and the ID 16706 is one 16720.

The ReferenceID is an additional reference number that is required for certain credit cards or customer cards for security purposes to guarantee error-free processing. For the ReferenceID 16722, the Category is Element 16724, the Object Class is PaymentCard 16726, the Property is Reference Identification 16728, the Representation/Association term is Identifier 16730, the Type term is CCT 16732, the Type Name term is Identifier 16734, and the Length is from one to twenty-five 16736. The Cardinality between the GDT PaymentCard 16700 and the ReferenceID 16722 is zero or one 16738. The ReferenceID 16722 may be restricted 16740.

The SequenceID is a sequence number of the payment card that indicates that the bank has issued more than one card for an account, and identifies which card is being used in this case.

For the SequenceID 16740, the Category is Element 16742, the Object Class is PaymentCard 16744, the Property is Sequence Identification 16746, the Representation/Association term is Identifier 16748, the Type term is CCT 16750, the Type Name term is Identifier 16752, and the Length is from one to ten 16754. The Cardinality between the GDT PaymentCard 16700 and the SequenceID 16740 is zero or one 16756. The SequenceID 16740 may be restricted 16758.

The Holder is the name of the cardholder (name of a person or company; for a person's name, both first and last names are usually included). For the Holder 16760, the Category is Element 16762, the Object Class is Payment Card 16764, the Property is Holder 16766, the Representation/Association term is Text 16768, the Type term is CCT 16770, the Type Name term is text 16772, and the Length is from one to forty 16774. The Cardinality between the GDT PaymentCard 16700 and the Holder 16760 is zero or one 16776.

The ExpirationDate is an expiration date of the payment card. For the ExpirationDate 16778, the Category is Element 16780, the Object Class is Payment Card 16782, the Property is Expiration Date 16784, the Representation/Association term is Date 16786, the Type term is GDT 16788, and the Type Name term is Date 16790. The Cardinality between the GDT PaymentCard 16700 and the ExpirationDate 16778 is one 16792.

No restriction is placed on company-specific customer cards in terms of the possible identifications based on UN/CEFACT code list DE 3055. The GDT PaymentCard 16700 is used when the payment card is a credit card that belongs to one of the listed standard types, or a company-specific customer card.

(cccccc) PaymentCardID

A GDT PaymentCardID 16800 is a unique identifier for a payment card. An example is:

```
    CreditCard VISA:
    <PaymentCardID
        schemeAgencyID="XYZ" schemeAgencySchemeID="9362"
schemeAgencySchemeAgencyID="5">5555222200008888
    </IPaymentCardID>
    CustomerCard IKEAGold:
    <PaymentCardID>
        schemeID="IKEAGold" schemeAgencyID="124224"
schemeAgencySchemeID="DUNS" schemeAgencySchemeAgencyID=
"16"> AEIBDEFXXXX
    </PaymentCardID>
```

The structure of GDT PaymentCardID 16800 is depicted in FIG. 168. The GDT PaymentCardID 16800 includes attributes schemeID 16820, schemeAgencyID 16838, schemeAgencySchemeID 16856, and schemeAgencySchemeAgencyID 16874. For the GDT PaymentCardID 16800, the Category is Element 16802, the Object Class is Payment Card 16804, the Property is Identification 16806, the Representation/Association term is Identifier 16808, the Type term is CCT 16810, the Type Name term is Identifier 16812, and the Length is from one to twenty-five 16814. The Cardinality of the GDT PaymentCardID 16800 is one 16816. The GDT PaymentCardID 16800 may be a restricted GDT.

For the schemeID 16820, the Category is Attribute 16822, the Object Class is Identification Scheme 16824, the Property is Identification 16826, the Representation/Association term is Identifier 16828, the Type term is xsd 16830, the Type Name term is token 16832, and the Length is from one to sixty 16834. The Cardinality between the GDT PaymentCardID 16800 and the schemeID 16820 is one 16836.

For the schemeAgencyID 16838, the Category is Attribute 16840, the Object Class is Identification Scheme Agency 16842, the Property is Identification 16844, the Representation/Association term is Identifier 16846, the Type term is xsd 16848, the Type Name term is token 16850, and the Length is from one to sixty 16852. The Cardinality between the GDT PaymentCardID 16800 and the schemeAgencyID 16838 is one 16854.

For the schemeAgencySchemeID 16856, the Category is Attribute 16858, the Object Class is Identification Scheme Agency 16860, the Property is Scheme 16862, the Representation/Association term is Identifier 16864, the Type term is xsd 16866, the Type Name term is token 16868, and the Length is from one to sixty 16870. The Cardinality between the GDT PaymentCardID 16800 and the schemeAgencySchemeID 16856 is zero or one 16872.

For the schemeAgencySchemeAgencyID 16874, the Category is Attribute 16876, the Object Class is Identification Scheme Agency 16878, the Property is Scheme Agency 16880, the Representation/Association term is Identifier 16882, the Type term is xsd 16886, the Type Name term is token 16886, and the Length is three 16888. The Cardinality between the GDT PaymentCardID 16800 and the schemeAgencySchemeAgencyID 16874 is zero or one 16890.

No restriction is placed on company-specific customer cards in terms of the possible identifications based on UN/CEFACT code list DE 3055. In an embodiment, the identifier for the standard types is based on the BIC (Bank Identification Code), whose scheme is standardized according to ISO 9362:1994. Therefore, the attribute "schemeAgencySchemeID" is set to 9362 for standard types, and the attribute "schemeAgencySchemeAgencyID" is set to '5' for ISO. Standard types are registered using SWIFT. These standard types can be queried at the following link: http://www.swift.com/biconline/index.cfm Then, e.g., "XYZ" is the result for attribute "schemeAgencyID."

The responsible organizations for the company-specific customer cards are identified via a generally valid and standardized identification, like that of Dun & Bradstreet. For this, the attribute "schemeID" may contain the identifier of the corresponding identification list (e.g., IKEAGold). In the attribute "schemeAgencyID," the particular unique identification may correspond to the responsible organization according to the international standardized identifier list (for example, DUNS). The attribute "schemeAgencySchemeID" contains the identification of the scheme on which the organization identifier is based, and the attribute "schemeAgencySchemeAgencyID" contains the particular identification according to the DE 3055 code list, which is responsible for the international and standardized identification scheme for the responsible organization of the company-specific customer card.

(dddddd) PaymentFormCode

The CDT PaymentFormCode 16900 is a coded representation of the payment form. The payment form is the way in which, e.g., goods or services are paid for. An example is: <PaymentFormCode>01</PaymentFormCode>.

The structure of CDT PaymentFormCode 16900 is depicted in FIG. 169. For the CDT PaymentFormCode 16900, the Object Class is Payment 16902, the Property is FormCode 16904, the Representation/Association term is Code 16906, the Type term is CCT 16908, the Type Name term is Code 16910, and the Length is two 16912. The CDT PaymentFormCode 16900 may be a restricted CDT.

CDT PaymentFormCode 16900 can have the following values: 01) Invoice, which means that the selling company issues an invoice to the buyer; 02) PaymentCard, which means that the buyer pays with credit card, customer card, or generally a payment card; 03) CashOnDelivery, which means that the payment is made on delivery; and 04) BankCollection, which means that the payment is carried out using automatic debit.

Existing standardized code lists (e.g., UN/EDIFACT code list '4461', Payment Means Code) may not cover these values. Consequently, the above code list may be used for this GDT, and this code list is submitted to the responsible standardization body. The CDT PaymentFormCode 16900 is used to determine the payment form when goods or services are ordered. The code "Invoice" is the default value.

The CDT PaymentFormCode 16900 does not contain additional information needed for payment processing, e.g., the type and number of the credit card or the number of the bank account from which the payment should be debited. Some of this information is transmitted in other parts of the message, and some is transmitted in separate messages. The CDT PaymentFormCode 16900 should not be confused with the PaymentMethod, which describes in detail how a payment is carried from FI, HR, or the Treasury.

Some parts of the UN/EDIFACT code list 4461 (Payment Means Code) (or ASC X12 107) can also be used for the PaymentMethodCode, including 1) Domestic bank transfer; 2) Foreign bank transfer; 3) Postal transfer; 4) Bank direct debit; 5) Check; 6) Order check; 7) Bank check; and 8) Bill of exchange.

A suitable payment method is determined based on the payment form. These two terms cannot be placed together in one list, as shown below.

| PaymentFormCode >>> | PaymentMethodCode |
|---|---|
| Invoice | BankTransfer, Check |
| PaymentCard | PaymentCard |
| CashOnDelivery | Check, Cash |
| BankCollection | DirectDebit |

Up until CRM 4.0, three values (PaymentCard, CashOnDelivery, Per Invoice) are used. If a payment is to be made per invoice, it is not necessary to specify a payment form. To use a new value, an implementation for the new code may be made; therefore, CRM may not accept other values.

(eeeeee) Percent

A GDT Percent 17000 is a number that relates to the comparison FIG. 100. An example is: <ProductTaxPercent>16</ProductTaxPercent>.

The structure of GDT Percent 17000 is depicted in FIG. 170. GDT Percent 17000 is given as a percent value. For the GDT Percent 17000, the Category is Element 17002, the Representation/Association term is Percent 17004, the Type term is xsd 17006, the Type Name term is decimal 17008, and the Length is maximum ten predecimal values and 6 decimal values 17010.

Positive and negative values can be used by using the built-in data type "xsd:decimal." Negative values may be prefixed with a negative sign ("–"). However, positive values do not require a positive sign "+" prefix.

No measurements or currencies are specified in GDT Percent 17000.

GDT Percent 17000 can be used to represent a percentage that indicates how many hundredths of a basic value are to be calculated. The result of the calculation is the proportion in percent of, e.g., amounts, values, rates, discounts, and taxes. Further examples for the application of Percent are proportion and comparison information, such as dividends and earnings, or a percentage comparison of target and actual business results, or trade or amount margins.

Information on measurements or currencies may be expressed in the basic value, for example:

```
<Total>
<Amount currencyCode="EUR">777.95</Amount>
<ProductTaxPercent>16</ProductTaxPercent>
</Total>
```

Here the value added tax rate of 16 percent is specified for the basic value of 777.95 EUR.

(ffffff) PersonName

A GDT PersonName 17100 contains the parts of a natural person's name. An example is:

```
<PersonName>
    <FormattedName>Mr. Paul John Tester</FormattedName>
    <LegalName>Paul John Tester</LegalName>
    <GivenName></GivenName>
    <PreferredGivenName>Paul</PreferredGivenName>
    <MiddleName>John</MiddleName>
    <Family>
        <FamilyName>Tester</FamilyName>
        <PrimaryIndicator>true</PrimaryIndicator>
        <FamilyNamePrefix></FamilyNamePrefix>
    </Family>
    <Affix>
        <AffixName>Mr.</AffixName>
        <AffixCode>FormOfAddress</AffixCode>
    </Affix>
</PersonName>
```

The structure of GDT PersonName 17100 is depicted in FIG. 171. The GDT PersonName 17100 includes elements FormattedName 17108, LegalName 17126, GivenName 17144, PreferredGivenName 17162, MiddleName 17180, Family 17198, FamilyName 17111, PrimaryIndicator 17127, FamilyNamePrefix 17147, Affix 17167, AffixName 17179, and AffixCode 17197. For the GDT PersonName 17100, the Category is Element 17102, the Object Class is PersonName 17104, and the Representation/Association term is Details 17106.

The attribute FormattedName 17108 contains, in one string, a formatted name with its pieces in their places. This includes the necessary punctuation. For the FormattedName 17108, the Category is Element 17110, the Object Class is PersonName 17112, the Property is FormattedName 17114, the Representation/Association term is Name 17116, the Type term is xsd 17118, the Type Name term is string 17120, and the Length is eighty 17122. The Cardinality between the GDT PersonName 17100 and the FormattedName 17108 is zero or one 17124.

The attribute LegalName 17126 is the legal name used for legal documentation or other legal purposes. LegalName 17126 contains, in one string, a formatted name with its pieces in their places. This includes the necessary punctuation. For the LegalName 17126, the Category is Element 17128, the Object Class is PersonName 17130, the Property is LegalName 17132, the Representation/Association term is Name 17134, the Type term is xsd 17136, the Type Name term is string 17138, and the Length is eighty 17140. The Cardinality between the GDT PersonName 17100 and the LegalName 17126 is zero or one 17142.

The attribute GivenName 17144 contains the given or chosen name. Also known as a person's first name. If multiple givenNames are used, the order is implied. For the GivenName 17144, the Category is Element 17146, the Object Class is PersonName 17148, the Property is GivenName 17150, the Representation/Association term is Name 17152, the Type term is xsd 17154, the Type Name term is string 17156, and the Length is forty 17158. The Cardinality between the GDT PersonName 17100 and the GivenName 17144 is zero or unbounded 17160.

The attribute PreferredGivenName 17162 contains the chosen name by which the person prefers to be addressed. Note: This name may be a name other than a given name, such as a nickname. For the PreferredGivenName 17162, the Category is Element 17164, the Object Class is PersonName 17166, the Property is PreferredGivenName 17168, the Representation/Association term is Name 17170, the Type term is xsd 17172, the Type Name term is string 17174, and the Length is from one to forty 17176. The Cardinality between the GDT PersonName 17100 and the PreferredGivenName 17162 is zero or one 17178.

The attribute MiddleName 17180 contains a person's middle name or initial. For the MiddleName 17180, the Category is Element 17182, the Object Class is PersonName 17184, the Property is MiddleName 17186, the Representation/Association term is Name 17188, the Type term is xsd 17190, the Type Name term is string 17192, and the Length is from one to forty 17194. The Cardinality between the GDT PersonName 17100 and the MiddleName 17180 is zero or unbounded 17196.

The attribute Family 17198 contains the non-chosen or inherited name. Also known as a person's last name in the Western context. For the Family 17198, the Category is Element 17101, the Object Class is PersonName 17103, the Property is Family 17105, and the Representation/Association term is Detail 17107. The Cardinality between the GDT PersonName 17100 and the Family 17198 is zero or unbounded 17109.

The element FamilyName 17111 describes the non-chosen or inherited name. For the FamilyName 17111, the Category is Element, the Object Class is Family 17113, the Property is FamilyName 17115, the Representation/Association term is Name 17117, the Type term is xsd 17119, the Type Name term is string 17121, and the Length is from one to forty 17123. The Cardinality between the GDT PersonName 17100 and the FamilyName 17111 is one 17125.

The element PrimaryIndicator 17127 allows you to mark one family name to be printed or shown first. For the PrimaryIndicator 17127, the Category is Element 17129, the Object Class is Family 17131, the Property is FamilyNamePrimaryCode 17133, the Representation/Association term is Code 17135, the Type is CCT 17137, the Type Name term is Indicator 17139, and the Length is one 17141. The Cardinality between the GDT PersonName 17100 and the PrimaryIndicator 17127 is zero or one 17143. The PrimaryIndicator 17127 is a no default value 17145.

The element FamilyNamePrefix 17147 contains the PersonName prefix, such as an aristocratic prefix. For the FamilyNamePrefix 17147, the Category is Element 17149, the Object Class is Family 17151, the Property is FamilyNamePrefix 17153, the Representation/Association term is Text 17155, the Type term is xsd 17157, the Type Name term is string 17159, and the Length is from one to twenty 17161. The Cardinality between the GDT PersonName 17100 and the FamilyNamePrefix 17147 is zero or one 17163. The FamilyNamePrefix 17147 may be different from the HR-XML Proposal 17165.

The attribute Affix 17167 contains the remaining parts of the PersonName as defined by the elements AffixName and AffixCode. For the Affix 17167, the Category is Element 17169, the Object Class is PersonName 17171, the Property is Affix 17173, and the Representation/Association term is Detail 17175. The Cardinality between the GDT PersonName 17100 and the Affix 17167 is zero or unbounded 17177.

The element AffixName 17179 contains the affix. For the AffixName 17179, the Category is Element 17181, the Object Class is Affix 17183, the Property is Affix 17185, the Representation/Association term is Name 17187, the Type term is xsd 17189, the Type Name term is string 17191, and the Length is from one to twenty 17193. The Cardinality between the GDT PersonName 17100 and the AffixName 17179 is one 17195.

The element AffixCode 17197 defines the context for the affix. For the AffixCode 17197, the Category is Element 17199, the Object Class is Affix 17102*a*, the Property is AffixCode 17104*a*, the Representation/Association term is Code 17106*a*, the Type is CCT 17108*a*, the Type Name term is Code 17110*a*, and the Length is from one to twenty 17112*a*. The Cardinality between the GDT PersonName 17100 and the AffixCode 17197 is one 17114*a*.

The code=aristocraticTitle, contains titles, such as, Baron, Earl, and so on. The code=formOfAddress, contains the form of address, for example Mr., Mrs., Hon., Dr., or Major. The code=generation, contains terms such as, Sr., Jr., III (the third). The code=qualification, contains the letters used to describe academic or other type qualifications held by a person and/or the distinctions conferred upon them, for example PhD, MD, CPA, or MCSD.

GDT PersonName 17100 is used to identify actual people.

(gggggg) PersonnelTimeEventID

A GDT PersonnelTimeEventID 17200 is a unique ID for a personnel time event. A personnel time event is a change in the execution of services of a personnel resource with which one personnel time ends and another personnel time begins. Such changes can include, e.g., the start of work, interruption of work or end of work. A personnel time event is characterized by a type such as, e.g., "clock-in entry," "clock-out entry," or "start of break." A personnel time event can include additional information (e.g., reference to project, order, cost center) for different target applications (e.g., project system or Controlling). An example is:

<PersonnelTimeEventID>1234567890123456</PersonnelTimeEventID>.

The structure of GDT PersonnelTimeEventID 17200 is depicted in FIG. 172. The GDT PersonnelTimeEventID 17200 includes attributes schemeID 17216 and schemeAgencyID 17234. For the GDT PersonnelTimeEventID 17200, the Object Class is Personnel Time Event 17202, the Property is Identification 17204, the Representation/Association term is Identifier 17206, the Type term is GDT 17208, the Type Name term is Identifier 17210, and the Length is from one to forty 17212. The GDT PersonnelTimeEventID 17200 may be a restricted GDT.

The schemeID specifies the scheme according to which the ID was assigned. Currently, the following schemes are provided: 1) PersonnelTimeEventGUID, which identifies the personnel time event via a Global Unique Identifier; and 2) PersonnelTimeTypeID: Identifies the personnel time event via an internal identifier of the scheme agency. For the schemeID 17216, the Category is Attribute 17218, the Object Class is IdentificationScheme 17220, the Property is Identification 17222, the Representation/Association term is Identifier 17224, the Type term is xsd 17226, the Type Name term is Token 17227, and the Length is from one to sixty 17230. The Cardinality between the GDT PersonnelTimeEventID 17200 and the schemeID 17216 is zero or one 17232.

The schemeAgencyID 17234 identifies the business system in which the ID was assigned. For the schemeAgencyID 17234, the Category is Attribute 17236, the Object Class is IdentificationSchemeAgency 17238, the Property is Identification 17240, the Representation/Association term is Identifier 17242, the Type term is xsd 17244, the Type Name term is Token 17246, and the Length is from one to sixty 17248. The Cardinality between the GDT PersonnelTimeEventID 17200 and the schemeAgencyID 17234 is zero or one 17250.

If PersonnelTimeEventGUID is used for schemeID, PersonnelTimeEventID may comprise 1-40 characters. If "PersonnelTimeEventID" is used, PersonnelTimeEventID may comprise 1-16 characters and may be alphanumeric. If schemeID and schemeAgencyID have not been specified, they may be determined from the context.

(hhhhhh) PersonnelTimeEventTypeID

A GDT PersonnelTimeEventTypeID 17300 is a unique ID for a personnel time event type. A personnel time event type is a classification of personnel time events according to personnel time management criteria. A typical criterion is whether the employee is at work or not. Examples are "clock-in entry," "clock-out entry," or "start of break." An example is:

<PersonnelTimeEventTypeID>1234567890123456</PersonnelTimeEventTypeID>

The structure of GDT PersonnelTimeEventTypeID 17300 is depicted in FIG. 173. The GDT PersonnelTimeEventTypeID 17300 includes attributes schemeID 17316 and schemeAgencyID 17334. For the GDT PersonnelTimeEventTypeID 17300, the Object Class is Personnel Time Event Type 17302, the Property is Identification 17304, the Representation/Association term is Identifier 17306, the Type term is GDT 17308, the Type Name term is Identifier 17310, and the Length is from one to forty 17312. The GDT PersonnelTimeEventTypeID 17300 may be a restricted GDT.

SchemeID 17316 identifies the scheme according to which the ID was assigned. For example, the following schemes may be supported: 1) PersonnelTimeEventTypeGUID, which identifies the personnel time event type using a Global Unique Identifier; and 2) PersonnelTimeEventTypeID: Identifies the personnel time event type using an internal identifier for the scheme agency. For the schemeID 17316, the Category is Attribute 17318, the Object Class is IdentificationScheme 17320, the Property is Identification 17322, the Representation/Association term is Identifier 17324, the Type term is xsd 17326, the Type Name term is Token 17328, and the Length is from one to sixty 17330. The Cardinality between the GDT PersonnelTimeEventTypeID 17300 and the schemeID 17316 is zero or one 17332.

The schemeAgencyID 17334 specifies the business system in which the ID was assigned. For the schemeAgencyID 17334, the Category is Attribute 17336, the Object Class is IdentificationSchemeAgency 17338, the Property is Identification 17340, the Representation/Association term is Identifier 17342, the Type term is xsd 17344, the Type Name term is Token 17346, and the Length is from one to sixty 17348. The Cardinality between the GDT PersonnelTimeEventTypeID 17300 and the schemeAgencyID 17334 is zero or one 17350.

If the PersonnelTimeEventTypeGUID is used for schemeID, the PersonnelTimeEventTypeID may comprise 1-40 characters. If the PersonnelTimeEventTypeID is used, the GDT PersonnelTimeEventTypeID 17300 may comprise 1-16 characters and may be alphanumeric. If the schemeID 17316 or the schemeAgencyID 17334 have not been specified, they may be determined from the context.

(iiiiii) PersonnelTimeID

A GDT PersonnelTimeID 17400 is a unique ID for a personnel time. A personnel time is a period of a personnel resource that is characterized by business, pay scale, or legal criteria. The period can be entered as a duration (e.g., 8 hours on 10.11.2003) or as clock times (e.g., from 8:10 to 17:30 on 10.11.2003). A personnel time is characterized by a personnel time type (e.g., "working time," "leave," "overtime," "availability for work," "illness," or "work break"). A personnel time can include additional information (e.g., reference to project, order, cost center) for different target applications (e.g., project system or Controlling). An example is: <PersonnelTimeID>1234567890123456</PersonnelTimeID>.

The structure of GDT PersonnelTimeID 17400 is depicted in FIG. 174. The GDT PersonnelTimeID 17400 includes attributes schemeID 17416 and schemeAgencyID 17434. For the GDT PersonnelTimeID 17400, the Object Class is Personnel Time 17402, the Property is Identification 17404, the Representation/Association term is Identifier 17406, the Type term is GDT 17408, the Type Name term is Identifier 17410, and the Length is from one and forty 17412. The GDT PersonnelTimeID 17400 may be a restricted GDT.

The schemeID 17416 specifies the scheme according to which the identifier was assigned. For example, the following schemes may be provided: 1) PersonnelTimeGUID, which identifies the personnel time using a Global Unique Identifier; and 2) PersonnelTimeID: Identifies the personnel time using an internal identifier for the scheme agency. For the schemeID 17416, the Category is Attribute 17418, the Object Class is IdentificationScheme 17420, the Property is Identification 17422, the Representation/Association term is Identifier 17424, the Type term is xsd 17426, the Type Name term is Token 17428, and the Length is from one to sixty 17430. The Cardinality between the GDT PersonnelTimeID 17400 and the schemeID 17416.

The SchemeAgencyID 17434 indicates the business system in which the identifier was assigned. For the schemeAgencyID 17434, the Category is Attribute 17436, the Object Class is IdentificationSchemeAgency 17438, the Property is Identification 17440, the Representation/Association term is Identifier 17442, the Type term is xsd 17444, the Type Name term is Token 17446, and the Length is from one to sixty 17448. The Cardinality between the GDT PersonnelTimeID 17400 and the schemeAgencyID 17434 is zero or one 17450.

If the PersonnelTimeGUID is used for the schemeID, the PersonnelTimeID may comprise 1-40 characters. If the PersonnelTimeID" is used, the PersonnelTimeID may comprise 1-16 characters and may be alphanumeric. If the schemeID or the schemeAgencyID have not been specified, they may be determined from the context.

(jjjjjj) PersonnelTimeTypeID

A GDT PersonnelTimeType ID 17500 is a unique identifier for a personnel time type. The PersonnelTimeType is a classification of personnel times according to business, pay scale, or legal criteria. Depending on whether the employee is at work or absent, the classification can be made according to payment-relevant or further personnel time management criteria. Examples include "working time," "leave," "overtime," "availability for work," "illness" or "work break." An example is: <PersonnelTimeTypeID>1234567890123456</PersonnelTimeTypeID>.

The structure of GDT PersonnelTimeTypeID 17500 is depicted in FIG. 175. The GDT PersonnelTimeTypeID 17500 includes attributes schemeID 17516 and schemeAgencyID 17534. For the GDT PersonnelTimeTypeID 17500, the Object Class is Personnel Time Type 17502, the Property is Identification 17504, the Representation/Association term is Identifier 17506, the Type term is GDT 17508, the Type Name term is Identifier, and the Length is from one to forty 17512. The GDT PersonnelTimeTypeID 17500 may be a restricted GDT.

The schemeID 17516 indicates the scheme according to which the identifier was assigned. For example, the following schemes may be provided: 1) PersonnelTimeTypeGUID, which identifies the personnel time type using a Global Unique Identifier; and 2) PersonnelTimeTypeID, which identifies the personnel time type using an internal identifier for the scheme agency. For the schemeID 17516, the Category is Attribute 17518, the Object Class is IdentificationScheme 17520, the Property is Identification 17522, the Representation/Association term is Identifier 17524, the Type term is xsd 17526, the Type Name term is Token 17528, and the Length is from one to sixty 17530. The Cardinality between the GDT PersonnelTimeTypeID 17500 and the schemeID 17516 is zero or one 17532.

The SchemeAgencyID 17534 specifies the business system in which the ID was assigned. For the schemeAgencyID 17534, the Category is Attribute 17536, the Object Class is IdentificationSchemeAgency 17538, the Property is Identification 17540, the Representation/Association term is Identifier 17542, the Type term is xsd 17544, the Type Name term is Token 17546, and the Length is from one to sixty 17548. The Cardinality between the GDT PersonnelTimeTypeID 17500 and the schemeAgencyID is zero or one 17550.

If the PersonnelTimeTypeGUID is used for the schemeID, the PersonnelTimeTypeID may comprise 1-40 characters. If the PersonnelTimeTypeID is used, the PersonnelTimeTypeID may comprise 1-16 characters and may be alphanumeric. If the schemeID or the schemeAgencyID have not been specified, it may be possible to determine them from the context.

(kkkkkk) PhoneNumber

A GDT PhoneNumber 17600 is a telephone number that comprises the international dialing code, regional area code, number, and extension. An example is:

```
<PhoneNumber>
    <AreaID>6227</AreaID>
    <SubscriberID>7</SubscriberID>
    <ExtensionID>47474</ExtensionID>
    <CountryCode>DE</ CountryCode>
</PhoneNumber>
```

The structure of GDT PhoneNumber 17600 is depicted in FIG. 176. The GDT PhoneNumber 17600 contains one telephone number. The GDT PhoneNumber 17600 includes elements AreaID 17606, SubscriberID 17626, ExtensionID 17646, and CountryCode 17666. For the GDT PhoneNumber 17600, the Object Class is PhoneNumber 17602 and the Representation/Association term is Details 17604.

The AreaID 17606 indicates the area code if known separately. It may be displayed in standardized format, i.e., without a leading zero or the like. Alternatively, the area code can be displayed together with the telephone number in SubscriberID 17626. When using a mobile phone number, the AreaID 17606 contains the prefix for the mobile phone network (also without a leading zero or the like). The synonym for AreaID 17606 is AreaCodeNumber. For the AreaID 17606, the Category is Element 17608, the Object Class is PhoneNumber 17610, the Property is PhoneNumberArea 17612, the Representation/Association term is Identifier 17614, the Type term is CCT 17616, the Type Name term is Identifier 17618, and the Length is from one to ten 17620. The Cardinality between the GDT PhoneNumber 17600 and the AreaID 17606 is zero or one 17622. The AreaID 17606 may be restricted 17624.

The SubscriberID 17626 may indicate the telephone number without the regional area code and without the international dialing code. Alternatively, SubscriberID 17626 can also contain the telephone number together with the regional area code, extension, or both. SubscriberID 17626 is displayed in a standardized format that can contain numbers or letters and cannot contain blanks or special characters. A synonym for SubscriberID 17626 is SubscriberNumber. For the SubscriberID 17626, the Category is Element 17628, the Object Class is PhoneNumber 17630, the Property is PhoneNumberSubscriber 17632, the Representation/Association term is Identifier 17634, the Type term is CCT 17636, the Type Name term is Identifier 17638, and the Length is from one to thirty 17640. The Cardinality between the GDT PhoneNumber 17600 and the SubscriberID 17626 is zero or one 17642. The SubscriberID 17626 may be restricted 17644.

The ExtensionID 17646 indicates the extension if the telephone number comprises a telephone number and an extension. Alternatively, the extension can be included in SubscriberID 17626 together with the telephone number. ExtensionID 17646 may be empty if the telephone number is a cell phone number. A synonym for ExtensionID 17646 is ExtensionTelephoneNumber. For the ExtensionID 17646, the Category is Element 17648, the Object Class is PhoneNumber 17650, the Property is PhoneNumberExtension 17652, the Representation/Association term is Identifier 17654, the Type term is CCT 17656, the Type Name term is Identifier 17658, and the Length is from one to ten 17660. The Cardinality between the GDT PhoneNumber 17600 and the ExtensionID 17646 is zero or one 17662. The ExtensionID 17646 may be restricted 17664.

The CountryCode 17666 identifies the country code in accordance with ISO 3166-1. It is used to determine the international dialing code. If it is empty, the country can be derived from the address instead. The country entered in the address and the country for the telephone number can also be different if the telephone number is provided in the context of an address. The country code is more appropriate for determining the international dialing code than the standardized format (e.g., +49). For the CountryCode 17666, the Category is Element 17668, the Object Class is PhoneNumber 17670, the Property is PhoneNumberCountry 17672, the Representation/Association term is Code 17674, the Type term is GDT 17676, and the Type Name is CountryCode 17678. The Cardinality between the GDT PhoneNumber 17600 and the CountryCode 17666 is zero or one 17680.

The telephone number is divided into components based on the Microsoft TAPI specification and ITU guidelines (International Telecommunication Union). The GDT PhoneNumber 17600 is used to describe the sequence of numbers that may be dialed to establish a connection. The GDT PhoneNumber 17600 is used for Telephone, MobilePhone, and Facsimile (fax), all of which have a similar structure.

(llllll) Price

A GDT Price 17700 is the exchange value, expressed in a monetary unit, of a product or a service in relation to a basic amount. An example is:

```
<NetPrice>
    <Amount currencyCode="EUR">32.14</Amount>
    <BaseQuantity unitCode="C62">1</BaseQuantity>
</NetPrice>
```

(Note: According to UN/ECE Recommendation 20, C62 is a piece.

The structure of GDT Price 17700 is depicted in FIG. 177. The GDT Price 17700 includes elements Amount 17706 and BaseQuantity 17720. For the GDT Price 17700, the Object Class is Price 17702 and the Representation/Association term is Details 17704.

For the Amount 17706, the Category is Element 17708, the Object Class is Price 17710, the Property is Amount 17712, the Representation/Association term is Amount 17714, the Type term is GDT 17716, and the Type Name term is Amount 17718. The Cardinality between the GDT Price 17700 and the Amount 17706 is one. For more on the Amount 17706, see GDT Amount.

For the BaseQuantity 17720, the Category is Element 17722, the Object Class is Price 17724, the Property is Base 17726, the Representation/Association term is Quantity 17728, the Type term is GDT 17730, and the Type Name term is Quantity 17732. The Cardinality between the GDT Price 17700 and the BaseQuantity 17720 is one. For more on the BaseQuantity 17720, see GDT Quantity.

GDT Price 17700 is used for the price of goods, products, and services. See the following examples: 1) Natural price; 2) Market price; 3) Unit price; 4) Total price; and 5) Recommended price.

(mmmmmm) PriceComponent

A GDT PriceComponent 17800 is a non-fiscal part of a price that was calculated for the quantity of a product. An example is:

```
<PriceComponent >
    <TypeCode>0001</TypeCode >
    <Description languageCode="EN">Product Base
    Price</Description >
    <Amount currencyCode="EUR">250</Amount>
</PriceComponent >
<PriceComponent >
    <TypeCode>0004</TypeCode >
    <Description languageCode="EN">Customer
    Discount</Description >
    <BaseAmount currencyCode="EUR">250</BaseAmount>
    <Percent>5</Percent>
    <Amount currencyCode="EUR">12.5</Amount>
</PriceComponent >
```

The structure of GDT PriceComponent 17800 is depicted in FIG. 178. The GDT PriceComponent 17800 includes elements TypeCode 17808, Description 17826, BaseAmount 17842, Percent 17858, and Amount 17874. For the GDT PriceComponent 17800, the Category is Complex 17802, the Object Class is PriceComponent 17804, and the Representation/Association term is Details 17806.

The TypeCode 17808 is the coded representation of a type of price component according to GDT PriceComponentTypeCode. For the TypeCode 17808, the Category is Element 17810, the Object Class is PriceComponent 17812, the Property is Type Code 17814, the Representation/Association term is Code 17816, the Type term is GDT 17818, the Type Name term is PriceComponentTypeCode 17820, and the Length is four 17822. The Cardinality between the GDT PriceComponent 17800 and the TypeCode 17808 is one 17824.

The Description 17826 is additional natural language information on price component, which may be optional. For the Description 17826, the Category is Element 17828, the Object Class is PriceComponent 17830, the Property is Description 17832, the Representation/Association term is Text 17834, the Type term is GDT 17836, and the Type Name term is Description 17838. The Cardinality between the GDT PriceComponent 17800 and the Description 17826 is zero or one 17840.

The BaseAmount 17842 is the base amount from which a price component is calculated using a percentage, which may be optional. For the BaseAmount 17842, the Category is Element 17844, the Object Class is PriceComponent 17846, the Property is Base Amount 17848, the Representation/Association term is Amount 17850, the Type term is GDT 17852, and the Type Name term is Amount 17854. The Cardinality between the GDT PriceComponent 17800 and the BaseAmount 17842 is zero or one 17856.

The Percent 17858 is the percentage which is used to calculate a price component from a base amount, which may be optional. For the Percent 17858, the Category is Element 17860, the Object Class is PriceComponent 17862, the Property is Percent 17864, the Representation/Association term is Percent 17866, the Type term is GDT 17868, and the Type Name term is Percent 17870. The Cardinality between the GDT PriceComponent 17800 and the Percent 17858 is zero or one 17872.

The Amount 17874 is the amount of a price component. For the Amount 17874, the Category is Element 17876, the Object Class is PriceComponent 17878, the Property is Amount 17880, the Representation/Association term is Amount 17882, the Type term is GDT 17884, and the Type Name term is Amount 17886. The Cardinality between the GDT PriceComponent 17800 and the Amount 17874 is one 17888.

If GDT PriceComponents 17800 are specified for a quantity of a product, the PriceComponentTypeCode for the base price may be used once here. The two optional elements BaseAmount and Percent may either both be specified or not specified in each instance of PriceComponent. Manual changes to a percentage price component for the quantity of a product in the original document lead to the value calculated from the elements BaseAmount and Percent varying from the content of the element Amount. The element BaseAmount always has a non-negative value. The elements Percent and Amount can both be either positive or negative at the same time, e.g., to express a surcharge or discount.

The GDT PriceComponent 17800 is used to make the net price specified or to be specified in an invoice for an ordered or delivered quantity of products comprehensible by specifying price components. Therefore, it may be used in invoice items. Results of price calculations are preferably transmitted, not the exact calculation method, which can be complex due to, e.g., proprietary Customizings, user exits in the form of coding, scales, rounding difference clearing, price date or reference steps. Therefore, the GDT can be used for automated control of calculation results using a recipient system in a limited way (e.g., invoice verification). Different types of price components may be represented by "condition types" which are defined in customer-specific Customizing.

(nnnnnn) PriceComponentTypeCode

The GDT PriceComponentTypeCode 17900 is the coded representation of a non-fiscal price element type that was calculated for the quantity of a product. An example is: <PriceComponentTypeCode>0001</PriceComponentTypeCode>.

The structure of GDT PriceComponentTypeCode 17900 is depicted in FIG. 179.

The possible illustrative values of the PriceComponentTypeCode are:

1) Code 0001, which represents a Base Price, for example, for a price from a price list calculated as (quantity*unit price) or (weight*price per kg);

2) Code 0002, which represents a surcharge or discount based on a special product configuration, for example, a surcharge for the color 'red', surcharge for size "XL," discount for smaller model;

3) Code 0003, which represents a surcharge or discount based on sales promotion over a limited period of time, for example, a Christmas discount, Easter sale, summer surcharge;

4) Code 0004, which represents a surcharge or discount based on special group membership; typically a product belonging to a product group, the customer belonging to a customer group, or a combination of both, for example, an OEM surcharge for a product, corporate customer discount;

5) Code 0005, which represents a surcharge or discount for a quantity of the product based on a special agreement made when the order was taken or at the acquisition of the sales contract (manual entries);

6) Code 0006, which represents a surcharge or discount for a total order based on a special agreement made when the order was taken or at the acquisition of the sales contract (manual entries);

7) Code 0007, which represents a surcharge or discount for a quantity of the product based on deviations from standard business processing, for example, a minimum price, pallet discount, surcharge for incomplete pallet, mixed pallet discount, surcharge for incomplete mixed pallet, free-goods discount;

8) Code 0008, which represents a surcharge or discount for a total order based on deviations from standard business processing, for example, a minimum sales order value, minimum value surcharge;

9) Code 0009, which represents a surcharge or discount for a quantity of the product based on special calculation processing, for example, a 100% discount, rounding difference;

10) Code 0010, which represents a shipment costs/packaging/customs for a quantity of the product;

11) Code 0011, which represents a shipment costs/packaging/customs for a total order;

12) code 0012, which represents a cash discount.

The GDT PriceComponentTypeCode 17900 may be a proprietary code list with fixed predefined values. Changes to the permitted values involve changes to the interface. In an embodiment, related standardized code lists such as Price.Type.Code (UN/CEFACT 5375) or Price.Specification.Code (UN/CEFACT 5387) may not be used, since they contain a different semantic that is also worked out at a much greater level of detail. In the first case, e.g., the classifying of prices into different types according to special information for the quantity of products takes up a large amount of space. In the second case, however, the business circumstances determining the prices take up more space. For the GDT Price Component Type Code 17900, the Object Class is Price Component 17902, the Property is Type Code 17904, the Representation/Association term is Code 17906, the Type term is CCT 17908, the Type Name term is Code 17910, and the Length is four 17912.

(oooooo) PriceTimeSeries

A CDT PriceTimeSeries 18000 is time series information that consists of items that each contain a period with a start time and end time and a period-based price. An example is:

```
<PriceTimeSeries>
    <Item>
        <ValidityPeriod>
        <StartDateTime>2002-04-19T15:00:00Z</StartDateTime>
        <EndDateTime>2002-04-19T17:00:00Z</EndDateTime>
        </ValidityPeriod>
        <Price>
            <Amount currencyCode="EUR">32.14</Amount>
            <BaseQuantity unitCode="C62">1</BaseQuantity>
        </Price>
    </Item>
</PriceTimeSeries>.
```

The structure of CDT PriceTimeSeries 18000 is depicted in FIG. 180. The CDT PriceTimeSeries 18000 includes elements Item 18014, Validity-Period 18026, Price 18040, and Fixed-Indicator 18054. For the CDT PriceTimeSeries 18000, the Object Class Qual. term is Price 18002, the Object Class is TimeSeries 18004, the Representation/Association term is Details 18006, the Type term is GDT 18008, the Type Name term is TimeSeries 18010. The CDT PriceTimeSeries 18000 may be a restricted CDT 18012.

The PriceTimeSeriesItem 18014 is an item in a time series and can be repeated as often as required. For the Item 18014, the Category is Element 18016, the Object Class is TimeSeries 18018, the Property is Item 18020, and the Representation/Association term is Details 18022. The Cardinality between the CDT PriceTimeSeries 18000 and the Item 18014 is from one to n 18024. The ValidityPeriod 18026 describes the validity period of the time series item with a start time stamp and an end time stamp. For the Validity-Period 18026, the Category is Element 18028, the Object Class is TimeSeries 18030, the Property is ValidityPeriod 18032, the Representation/Association term is Details 18034, the Type term is 18036, and the Type Name term is DateTime-Period 18038. The Cardinality between the CDT Price-TimeSeries 18000 and the Validity-Period 18026 is one 18040.

The Price 18040 describes the price connected to the time series item. For the Price 18040, the Category is Element 18042, the Object Class is TimeSeries 18042, the Property is Price 18044, the Representation/Association term is Price 18046, the Type term is GDT 18048, and the Type Name term is Price 18050. The Cardinality between the CDT Price-TimeSeries 18000 and the Price 18040 is one 18052. The FixedIndicator 18054 describes whether the corresponding item for changes is blocked or not. For the Fixed-Indicator 18054, the Category is Element 18056, the Object Class is TimeSeries 18058, the Property is FixedIndicator 18060, the Representation/Association term is Indicator 18062, the Type term is GDT 18064, and the Type Name term is Fixed Indicator 18066. The Cardinality between the CDT Price-TimeSeries 18000 and the Fixed-Indicator 18054 is zero or one 18068.

The CDT PriceTimeSeries 18000 is used as a generic data type that can have various specifications in one interface, depending on the context category being used.

(pppppp) ProcurementCostUpperLimit

A GDT ProcurementCostUpperLimit 18100 is the cost upper limit for different types of procurement costs. An example is:

```
<ProcurementCostUpperLimit>
    <OverallLimit>
        <Amount currencyCode="EUR">10000.00</Amount>
        <AmountUnlimitedIndicator>false</AmountUnlimitedIndicator>
        <ExpectedAmount currencyCode="EUR">7500.00
        </ExpectedAmount>
    <OverallLimit>
    <ContractPartialLimit>
        <Amount currencyCode="EUR">0.00</Amount>
        <AmountUnlimitedIndicator>true</AmountUnlimitedIndicator>
        <ContractReference>
            <ID>4000008599</ID>
            <ItemID>148</ItemID>
        </ContractReference>
    </ContractPartialLimit>
    <MiscellaneousPartialLimit>
        <Amount currencyCode="EUR">500.00</Amount>
        <AmountUnlimitedIndicator>false</AmountUnlimitedIndicator>
    </MiscellaneousPartialLimit>
</ProcurementCostUpperLimit>.
```

The structure of GDT ProcurementCostUpperLimit 18100 is depicted in FIG. 181. The GDT Procurement Cost Upper Limit 18100 includes elements OverallLimit 18108, Amount 18120, Amount Unlimited Indicator 18134, Expected Amount 18150, Contract Partial Limit 18166, Amount 18178, Amount Unlimited Indicator 18194, ContractReference 181110, Miscellaneous Partial Limit 181126, Amount 181138, and Amount Unlimited Indicator 181154. For the GDT Procurement Cost Upper Limit 18100, the Object Class is Procurement Cost 18102, the Property is Upper Limit 18104, and the Representation/Association term is Details 18106.

The OverallLimit 18108 is the limit for the total costs in a procurement process. For the OverallLimit 18108, the Category is Element 18110, the Object Class is Procurement Cost Upper Limit 18112, the Property is Overall Limit 18114, and the Representation/Association term is Details 18116. The Cardinality between the GDT Procurement Cost Upper Limit 18100 and the OverallLimit 18108 is one 18118.

The OverallLimit/Amount 18120 is the cost upper limit that may not be exceeded in a procurement process. For the Amount 18120, the Category is Element 18122, the Object Class is Overall Limit 18124, the Property is Amount 18124, the Representation/Association term is Amount 18126, the Type term is GDT 18128, and the Type Name term is Amount 18130. The Cardinality between the GDT Procurement Cost Upper Limit 18100 and the Amount 18120 is zero or one 18132.

The OverallLimit/AmountUnlimitedIndicator 18134 indicates whether the amount in OverallLimit/Amount is unlimited. For the Amount Unlimited Indicator 18134, the Category is Element 18136, the Object Class is Overall Limit 18138, the Property is Amount Unlimited Indicator 18140, the Representation/Association term is Indicator 18142, the Type term is GDT 18144, and the Type Name term is ValueUnlimitedIndicator 18146. The Cardinality between the GDT Procurement Cost Upper Limit 18100 and the Amount Unlimited Indicator 18134 is zero or one 18148.

The OverallLimit/ExpectedAmount 18150 is the costs that are expected. The expected costs may be less than the maximum permitted costs. For the Expected Amount 18150, the Category is Element 18152, the Object Class is 18154, the Property is Expected Amount 18156, the Representation/Association term is Amount 18158, the Type term is GDT 18160, and the Type Name term is Amount 18162. The Cardinality between the GDT Procurement Cost Upper Limit 18100 and the Expected Amount 18150 is zero or one 18164.

The ContractPartialLimit 18166 is the partial limit for costs relating to a contract. For the Contract Partial Limit 18166, the Category is Element 18168, the Object Class is Procurement Cost Upper Limit 18170, the Property is Contract Partial Limit 18172, and the Representation/Association term is Details 18174. The Cardinality between the GDT Procurement Cost Upper Limit 18100 and the Contract Partial Limit 18166 is from zero to n 18176.

The ContractPartialLimit/Amount 18178 is the cost upper limit for a particular contract that may not be exceeded in a procurement process. For the Amount 18178, the Category is Element 18180, the Object Class is Contract PartialLimit 18182, the Property is Amount 18184, the Representation/Association term is Amount 18186, the Type term is GDT 18188, and the Type Name term is Amount 18190. The Cardinality between the GDT Procurement Cost Upper Limit 18100 and the Amount 18178 is zero or one 18192.

The ContractPartialLimit/AmountUnlimitedIndicator 18194 indicates whether the amount in ContractLimit/Amount is unlimited. For the Amount Unlimited Indicator 18194, the Category is Element 18196, the Object Class is Contract PartialLimit 18198, the Property is Amount Unlimited Indicator 181100, the Representation/Association term is Indicator 181102, the Type term is GDT 181104, and the Type Name term is ValueUnlimitedIndicator 181106. The Cardinality between the GDT Procurement Cost Upper Limit 18100, and the Amount Unlimited Indicator 18194 is zero or one 181108.

The ContractPartialLimit/ContractReference 181110 is the reference to a contract. For the ContractReference 181110, the Category is Element 181112, the Object Class is Contract PartialLimit 181114, the Property is Contract Reference 181116, the Representation/Association term is Business Transaction Document Reference 181118, the Type term is GDT 181120, and the Type Name is Business Transaction Document Reference 181122. The Cardinality between the GDT Procurement Cost Upper Limit 18100 and the ContractReference 181110 is one 181124. The ContractPartialLimit/ContractReference/ID 181126 is the contract number. The ContractPartialLimit/ContractReference/ItemID an item within the contract. If no item number is specified, the partial limit applies for all the items in the contract.

The MiscellaneousPartialLimit 181126 is the partial limit for the overall limit for miscellaneous costs. For the Miscellaneous Partial Limit 181126, the Category is Element 181128, the Object Class is Procurement Cost Upper Limit 181130, the Property is Miscellaneous PartialLimit 181132, and the Representation/Association term is Details 181134. The Cardinality between the GDT Procurement Cost Upper Limit 18100 and the Miscellaneous Partial Limit 181126 is zero or one 181136.

The MiscellaneousPartialLimit/Amount 181138 is the cost upper limit for miscellaneous costs. For the Amount 181138, the Category is Element 181140, the Object Class is Miscellaneous PartialLimit 181142, the Property is Amount 181144, the Representation/Association term is 181146, the Type term is GDT 181148, and the Type Name is Amount 181150. The Cardinality between the GDT Procurement Cost Upper Limit 18100 and the Amount 181138 is zero or one 181152.

The MiscellaneousPartialLimit/AmountUnlimitedIndicator 181154 indicates whether the amount in MiscellaneousLimit/Amount is unlimited. For the Amount Unlimited Indicator 181154, the Category is Element 181156, the Object Class is Miscellaneous PartialLimit 181158, the Property is Amount Unlimited Indicator 181160, the Representation/Association term is Indicator 181162, the Type term is GDT 181164, and the Type Name term is ValueUnlimitedIndicator 181181. The Cardinality between the GDT Procurement Cost Upper Limit 18100 and the Amount Unlimited Indicator 181154 is zero or one 181168.

The rules for the GDT AmountUnlimitedIndicator apply for Amount and AmountUnlimitedIndicator. Currencies within a ProcurementCostUpperLimit may be identical. The OverallLimit/Amount may be greater than or equal to the OverallLimit/ExpectedAmount. If no ExpectedAmount is specified, the Amount is used as the ExpectedAmount. If no ExpectedAmount is specified and the Amount is unlimited, an ExpectedAmount of 0.00 is assumed. In an embodiment, the same contract/same contract item may not be referenced in different limits which refer to contracts.

A ProcurementCostUpperLimit is used to define the type and amount of costs that are permitted for limit items within an ordering process. Limit items are used as placeholders in purchase orders if the requirements are unknown at the time of ordering. This can be the case, e.g., for repairs, where the time and spare parts required are not known until the repair has been made.

Regarding the costs in a procurement process and the limits, the total of all the costs may not exceed the overall limit, though the total of all the partial limits may well exceed the overall limit. This can lead to mistakes, for example: 1) Overall limit of EUR 10,000; 2) Partial limit of EUR 8,000 for contract 4711; and 3) Miscellaneous partial limit of EUR 4,000. The total of the partial limits is EUR 12,000, which is greater than the overall limit of EUR 10,000. This makes sense when costs of EUR 8,000 and miscellaneous costs of EUR 3,000 (=total costs of EUR 11,000) are to be identified as too high for contract 4711.

(qqqqqq) ProductCategoryID

A GDT ProductCategoryID 18200 is a unique identifier for a product category. A product category is a division of products according to objective business-specific criteria. An example or instance is:

1. Reference to a category using a standard ID:

<ProductCategoryIDschemeID="eClass"schemeAgency-ID="ZZZ">AAA650001</ProductCategoryID>

2. Reference to a category using a version-dependent, hierarchical standard ID:

<ProductCategoryID schemeID="UNSPSC" schemeVersionID="11.0" schemeAgencyID="257">10.10.15.17.00</ProductCategoryID>

3. Reference to a category using a proprietary ID:

<ProductCategoryID schemeID='ProductCategories'-schemeAgencyID='123456789'schemeAgency-SchemeAgencyID='16'>0006</ProductCategoryID>

The structure of GDT ProductCategoryID 18200 is depicted in FIG. 182. The GDT ProductCategoryID 18200 is from the Core Component Type Identifier. The GDT ProductCategoryID 18200 includes attributes schemeID 18216, SchemeVersionID 18238, schemeAgencyID 18256, schemeAgencySchemeID 18274, and schemeAgency-SchemeAgencyID 18292. For the GDT ProductCategoryID 18200, the Object Class is ProductCategory 18202, the Property is Identification 18204, the Representation/Association term is Identifier 18206, the Type term is CCT 18208, the Type Name term is Identifier 18210, and the Length is from one to forty 18212. The GDT ProductCategoryID 18200 may be a restricted GDT.

The following classifications are supported for standard IDs: 1) schemeID 18216 of 'UNSPSC'; 2) schemeAgencyID 18256 of '257'; 3) schemeID of 'eClass'; and 4) schemeAgencyID of 'ZZZ'. The following classifications are supported for version-dependent, hierarchical standard IDs: 1) schemeID of 'UNSPSC'; 2) schemeVersionID of nn.m; 3) schemeAgencyID of '257'; 4) schemeID of 'eClass'; 5) schemeVersionID: nn.m; and 6) schemeAgencyID: 'ZZZ'. For the schemeID 18216, the Category is Attribute 18218, the Object Class is IdentificationScheme 18220, the Property is Identification 18222, the Representation/Association term is Identifier 18228, the Type term is xsd 18230, the Type Name term is Token 18232, and the Length is from one to sixty 18234. The Cardinality between the GDT ProductCategoryID 18200 and the schemeID 18216 is zero or one 18236.

For the SchemeVersionID 18238, the Category is Attribute 18240, the Object Class is IdentificationScheme 18242, the Property is Version 18244, the Representation/Association term is Identifier 18246, the Type term is xsd 18248, the Type Name term is Token 18250, and the Length is from one to fifteen 18252. The Cardinality between the GDT ProductCategoryID 18200 and the SchemeVersionID 18238 is zero or one 18254.

For the schemeAgencyID 18256, the Category is Attribute 18258, the Object Class is IdentificationSchemeAgency 18260, the Property is Identification 18262, the Representation/Association term is Identifier 18264, the Type term is xsd 18266, the Type Name term is Token 18268, and the Length is from one to sixty 18270. The Cardinality between the GDT ProductCategoryID 18200 and the schemeAgencyID 18256 is zero or one 18272.

For the schemeAgencySchemeID 18274, the Category is Attribute 18276, the Object Class is Identification-SchemeAgency 18278, the Property is Scheme 18280, the Representation/Association term is Identifier 18282, the Type term is xsd 18284, the Type Name term is Token 18286, and the Length is from one to sixty 18288. The Cardinality between the GDT ProductCategoryID 18200 and the schemeAgencySchemeID 18274 is zero or one 18290.

For the schemeAgencySchemeAgencyID 18292, the Category is Attribute 18294, the Object Class is Identification-SchemeAgency 18296, the Property is SchemeAgency 18298, the Representation/Association term is Identifier 18201, the Type term is xsd 18203, the Type Name term is Token 18205, and the Length is three 18207. The Cardinality between the GDT ProductCategoryID 18200 and the schemeAgencySchemeAgencyID 18292 is zero or one 18209.

Product CategoryID can be used, for example, in three ways:

1) For identifying a product category using a globally-unique, non-versioned, standardized ID. The ID is generally not structured hierarchically, i.e., it references one product category and does not contain information about how this category is based on several other general categories. The attribute schemeID and schemeAgencyID are used in the same way as planned in the CCT identifier for standard IDs. Other attributes are not specified.

2) For identifying a product category within a tree of product categories that build on one another and using a globally unique, standardized ID that contains information on the location of the category within the tree structure. The ID is generally version-dependent. The attribute schemeID and schemeVersionID and schemeAgencyID are used in the same way as planned in the CCT identifier for standard IDs. Other attributes are not specified.

3) For identifying a product category using a proprietary ID. The attributes schemeID, schemeAgencyID, schemeAgencySchemeID and schemeAgencySchemeAgencyID are used as planned for the CCT identifier in order to define the context for which a CategoryPartyID is guaranteed to be unique. Other attributes are not specified.

(rrrrrr) ProductCategoryInternalID

A CDT ProductCategoryInternalID 18300 is a proprietary identifier for a product category. A product category is a division of products according to objective criteria. Illustrative examples of ProductCategoryInternalID (SAP MDM) are:

The GUID of a product category:

<ProductCategoryInternalID schemeID="ProductCategoryGUID" schemeAgencyID="MPL__002">1C743CEC501F6A4D8826C7EC5A8554B9</ProductCategoryInternalID> schemeID="ProductCategoryGUID" indicates that the scheme "ProductCategoryGUID" was used to identify the product category.

schemeAgencyID="MPL__002" indicates that the scheme was assigned by the business system "MPL__002."

ProductCategoryID of a product category:

<ProductCategoryInternalID schemeID="ProductCategoryID" schemeAgencyID="MPL__002">Private Car Vehicles MPLCNT002</ProductCategoryInternalID>

The structure of CDT ProductCategoryInternalID 18300 is depicted in FIG. 183. The CDT ProductCategoryInternalID 18300 includes attributes schemeID 18316 and schemeAgencyID 18334. For the CDT ProductCategoryInternalID 18300, the Object Class is ProductCategory 18302, the Property is Internal Identification 18304, the Representation/Association term is Identifier 18306, the Type term is GDT 18308, the Type Name term is ProductCategoryID 18310, and the Length is from one to forty 18312. The CDT ProductCategoryInternalID 18300 may be a restricted CDT.

The attributes of a CDT ProductCategoryInternalID 18300 are filled, for example, as follows in SAP MDM:

1) The schemeID 18316, in which the following schemes are provided for:

1) The ProductCategoryGUID, which identifies a product category using a Global Unique Identifier, and 2) The ProductCategoryID, which identifies a product category using an identifier.

For the schemeID 18316, the Category is Attribute 18318, the Object Class is IdentificationScheme 18320, the Property is Identification 18322, the Representation/Association term is Identifier 18324, the Type term is xsd 18326, the Type Name term is Token 18328, and the Length is from one to sixty 18330. The Cardinality between the CDT ProductCategoryInternalID 18300 and the schemeID 18316 is zero or one 18332.

2) The schemeAgencyID 18334 for a Business system in which the number was assigned. For the schemeAgencyID 18334, the Category is Attribute 18336, the Object Class is IdentificationSchemeAgency 18338, the Property is Identification 18340, the Representation/Association term is Identifier 18342, the Type term is xsd 18344, the Type Name term is Token 18346, and the Length is from one to sixty 18348. The Cardinality between the CDT ProductCategoryInternalID 18300 and the schemeAgencyID 18334 is zero or one 18350.

The GDT ProductCategoryInternalID 18300 represents a projection of the GDT ProductCategoryID, in which the attributes schemeID and schemeAgencyID are contained for describing an internally assigned ID. If an attribute is not explicitly assigned in the use of the GDT, it may be determined through the context.

The ProductCategoryInternalID 18300 is used when both sender and recipient can access shared master data, e.g., during internal communication.

If the product category is identified using the ProductCategoryID scheme (schemeID), the product category may be uniquely identified using a combined key (e.g., the product category at an entity level can be uniquely identified (semantically) using ProductCategoryID, ProductHierarchyID and the logical system).

(ssssss) ProductCategoryPartyID

A CDT ProductCategoryPartyID 18400 is an identifier for a product category assigned by a party. A product category is a division of products according to objective criteria. An example is: <ProductCategorySellerID>0006</ProductCategorySellerID>.

The structure of CDT ProductCategoryPartyID 18400 is depicted in FIG. 184.

The CDT ProductCategoryPartyID 18400 is the proprietary identifier assigned by a party. The party (in its role) that assigned this identifier may derive from the business context of the message that uses the CDT ProductCategoryPartyID 18400. For the CDT Product Category Party ID 18400, the Object Class is Product Category 18402, the Property Quality term is Party 18404, the Property is Identification 18406, the Representation/Association term is Identifier 18408, the Type term is GDT 18410, the Type Name term is ProductCategoryID 18412, and the Length is from one to forty 18414. The CDT Product Category Party ID 18400 may be a restricted CDT 18416.

In contrast to CDT ProductCategoryStandardID 18500, the use of the CDT ProductCategoryPartyID 18400 is role-dependent (e.g., as an ID assigned by the Buyer).

The party is specified by its role. The Party is replaced with the partner role type (e.g., ProductCategorySellerID). SchemeID and SchemeVersionID are to be included as attributes as soon as there is a need to differentiate between several schemes. (See GDT ProductCategoryID).

(tttttt) ProductCategoryStandardID

A CDT ProductCategoryStandardID 18500 is a standardized identifier for a product category, whereby the identification scheme used may be managed by an agency from the code list DE 3055. A product category is a division of products according to objective criteria. An example is:

<ProductCategoryStandardID schemeID="UNSPSC" schemeVersionID="11.0"schemeAgencyID="113"> 10.10.15.17</ProductCategoryStandardID>

The structure of CDT ProductCategoryStandardID 18500 is depicted in FIG. 185. The CDT Product Category Standard ID 18500 includes attributes schemeID 18518, SchemeVersionID 18536, and schemeAgencyID 18554. For the CDT Product Category Standard ID 18500, the Object Class is Product Category 18502, the Property Qual. is Standard 18504, the Property is Identification 18506, the Representation/Association term is Identifier 18508, the Type term is GDT 18510, the Type Name is ProductCategoryID 18512, and the Length is from one to forty 18514. The CDT Product Category Standard ID 18500 may be a restricted CDT 18516.

For the schemeID 18518, the Category is Attribute 18520, the Object Class is IdentificationScheme 18522, the Property is Identification 18524, the Representation/Association term is Identifier 18526, the Type term is xsd 18528, the Type Name term is Token 18530, and the Length is from one to sixty 18532. The Cardinality between the CDT Product Category Standard ID 18500 and the scheme ID 18518 is zero or one 18534.

For the SchemeVersionID 18536, the Category is Attribute 18538, the Object Class is IdentificationScheme 18540, the Property is Version 18542, the Representation/Association term is Identifier 18544, the Type term is xsd 18546, the Type Name term is Token 18548, and the Length is from one to fifteen 18550. The Cardinality between CDT Product Category Standard ID 18500 and the SchemeVersionID 18536 is zero or one 18552.

The schemeAgencyID 18554 identifies the agency that manages an identification scheme. The agencies from DE 3055 are used as the default, but the roles defined in DE 3055 cannot be used. For the schemeAgencyID 18554, the Category is Attribute 18556, the Object Class is IdentificationSchemeAgency 18558, the Property is Identification 18560, the Representation/Association term is Identifier 18562, the Type term is xsd 18564, the Type Name term is Token 18566, and the Length is three 18568. The Cardinality between CDT Product Category Standard ID 18500 and the schemeAgencyID 18554 is one 18570. The following illustrative code is supported for a version-dependent hierarchical standard ID:

1) SchemeAgencyID="113"—UCC (Uniform Code Council) with 1) SchemeID="UNSPSC" (United Nations Standard Product and Services Classification Code); and 2) SchemeVersionID=nn.m (e.g. 11.0).

The GDT ProductCategoryStandardD 18500 represents a projection of the GDT ProductCategoryID, in which the attributes schemeID, schemeVersionID, and schemeAgencyID are contained for describing an ID assigned by a standardization organization (i.e., an organization registered in the DE 3055). The attribute schemeAgencyID may be a mandatory attribute.

In contrast to ProductCategoryPartyID, the use of ProductCategoryStandardID may not be role-dependent.

The SchemeID is another standardized identification scheme (for material classification and material groups) is "eClass" (current release status 5.0). The German Institute for Economics in Cologne provides the classification as an independent platform and central point of contact, free of charge, in the Internet under www.eClass.de (For the specification see www.eclass.de/informationen/download/eclassMerkmalleisten5__00.doc).

The version of eClass is a 2-digit number.

Illustrative usages of the SchemeID include: 1) SchemeAgencyID for the German Institute for Economics Cologne (not contained in DE 3055), wherein the SchemeID equals "eClass," and the SchemeVersionID equals nn (e.g. 42). If necessary, the SchemeID ETIM (www.etim.de) can also be examined for its applicability. (See also GDT ProductCategoryID).

(uuuuuu) ProductChangeID

A GDT ProductChangeID 18600 is a unique identifier for a change to a product which leaves the product unchanged in terms of its properties that are relevant for the user. Changes in terms of this definition may occur, e.g., due to changed manufacturing processes or the use of other modules/component batches. An example is:

<ProductChangeID>31337KSK/4711</ProductChangeID>.

The structure of GDT ProductChangeID 18600 is depicted in FIG. 186. For the GDT ProductChangeID 18600, the Category is Element 18602, the Object Class is Product Change 18604, the Property is Identification 18606, the Representation/Association term is Identifier 18608, the Type term is CCT 18610, the Type Name term is Identifier 18612, and the Length is from one to thirty-two 18614. The GDT ProductChangeID 18600 may be a restricted GDT.

ProductChangeIDs may be used, e.g., for a recall activity: Assuming the transistors installed in a product are replaced with other similar ones, then the features of the product are not changed and it should still have the same ProductID. However, if the transistors turn out to be faulty, it may be ensured that the serial numbers of the product affected are logged using ProductChangeIDs in case there is a resulting recall activity. If a change is made using change management, the ProductChangeID as a rule contains the ID of the relevant change order (ChangeOrderID).

In an example, in the R/3, GDT ProductChangeID 18600 is the change number that uniquely identifies a change master record for a product. A change identified here is neither a version nor a variant. For example, A yellow VW Golf C with leather seats would be "yellow with leather seats," a variant of version "C" of product "VW Golf."

(vvvvvv) ProductDemandInfluencingEventStatusCode

The GDT ProductDemandInfluencingEventStatusCode 18700 is a coded representation for the status of an event that influences the demand for products. The event might be, e.g., a promotional event. An example is:

<ProductDemandInfluencingEventStatusCode>
PLANNED</ProductDemandInfluencingEvent
StatusCode>.

The structure of GDT ProductDemandInfluencingEventStatusCode 18700 is depicted in FIG. 187. For the GDT Product Demand Influencing Event Status Code 18700, the Object Class is Product Demand Influencing Event 18702, the Property is Status 18704, the Representation/Association term is Code 18706, the Type term is CCT 18708, the Type Name term is Code 18710, and the Length is from one to thirty-five 18712. The GDT Product Demand Influencing Event Status Code 18700may be a restricted GDT.

The possible code values are a subset of the "Retail Event Status Code List" of the "EAN.UCC XML Business Message Standards, Version 1.3 (July 2003)." These are: 1) CANCELED; 2) COMPLETED; 3) PLANNED; 4) PROPOSED; and 5) TERMINATED.

(wwwwww) ProductDemandInfluencingEventTypeCode

The GDT ProductDemandInfluencingEventTypeCode 18800 is a coded representation for the type of an event that influences the demand for products. An example is:

<ProductDemandInfluencingEventTypeCode>HOLIDAY</ProductDemandInfluencingEventTypeCode>.

The structure of GDT ProductDemandInfluencingEventTypeCode 18800 is depicted in FIG. 188. For the GDT Product Demand Influencing Event Type Code 18800, the Object Class is Product Demand Influencing Event 18802, the Property is Type 18804, the Representation/Association term is Code 18806, the Type term is CCT 18808, the Type Name term is Code 18810, and the Length is from one to thirty-five 18812. The GDT Product Demand Influencing Event Type Code 18800 may be a restricted GDT.

The GDT groups several partial quantities of standard code lists, whereby the supported partial quantities are disjunctive. Therefore no attributes, or supplementary components, are needed to identify the relevant standard code list.

The illustrative code values may be subsets of the union of the "Miscellaneous Event Type Code List" and "Promotional Event Type Code List" of the "EAN.UCC XML Business Message Standards, version 1.3 (July 2003)." These are: (From the "Miscellaneous Event Type Code List"): 1) The code ASSORTMENT_CHANGE is used when the set of items that the location carries for this category is changing, affecting one or more items; 2) The code DISASTER is used when a hurricane, tornado, accident, attack, or some other catastrophic, unexpected event affecting supply or demand; 3) The code FREIGHT_FLOW_ALLOCATION is used when an item availability may be restricted, due to unexpected demand, transportation issues, production problems, or some other reason; 4) The code INVENTORY_POLICY_CHANGE is used when the inventory policy at the store or retail distribution center is changing, resulting in changes to the estimated supply of the item; 5) The code LABOR is used when a strike or other labor issue affects supply; 6) The code LOCATION_CLOSING is used when one or more locations that carry the item are closing. No promotion is associated with the item during the closing; 7) The code LOCATION_OPENING is used when one or more new locations is opening that will carry the item. No promotion is associated with the item during the opening; 8) The code PACKAGING_LABELING_CHANGE is used when the packaging or labeling of the item is changing, possibly affecting demand or distribution; 9) The code PRICE_DECREASE is used when the price is decreasing for the item at the retail location(s); 10) The code PRICE_INCREASE is used when the price is increasing for the item at the retail location(s); 11) The code STORE_FORMAT_OR_PLANOGRAM_CHANGE is used when the store format or planogram is changing, affecting one or more items; 12) The code TEST_MARKET is used when selling a new item at a limited set of locations to gauge consumer interest, or testing an existing item in a new channel or location; and 13) The code WEATHER is used when a heat wave, cold front, snow storm, or other weather phenomenon affecting supply or demand. (From the "Promotional Event Type Code List"): 1) The code COMMUNITY_EVENT is used when a promotional activity timed to coincide with a local, regional, or national event (charity drive, Indy 500, Grammy Awards); 2) The code HOLIDAY is used when a promotional activity timed to coincide with a national, regional, or religious holiday; 3) The code SEASONAL_EVENT is used when a promotional activity timed to coincide with a change in the season, or an annual cultural phenomenon (such as "back to school"); 4) The code STORE_CLOSING is used when a promotional activity timed to coincide with the elimination of one or more store locations (e.g. going-out-of-business sale); 5) The code STORE_OPENING is used when a promotional activity timed to coincide with the opening of one or more new store locations (e.g. grand opening sale); 6) The code TRADE_ITEM_DISCONTINUATION is used when a promotional activity timed to coincide with the elimination of a product from a location or market (e.g. clearance sale); and 7) The code TRADE_ITEM_INTRODUCTION is used when a promotional activity timed to coincide with the introduction of a new product to a location or market (xxxxxx) ProductDiscontinuationIndicator A GDT ProductDiscontinuationIndicator 18900 indicates whether a product is to be discontinued, i.e., removed from the product line, or not. An example, <ProductDiscontinuationIndicator>true</ProductDiscontinuationIndicator>.

The structure of GDT ProductDiscontinuationIndicator 18900 is depicted in FIG. 189. For the GDT ProductDiscontinuationIndicator 18900, the Object Class is Product 18902, the Property is Discontinuation 18904, the Representation/Association term is Indicator 18906, the Type term is CCT 18908, and the Type Name term is Indicator 18910. Valid values for 18900 are: 1) true, meaning that the product is discontinued; or 2) false, meaning that the product is not discontinued. (See CCT:Indicator for the value range).

(yyyyyy) ProductID

A GDT ProductID 19000 is a unique identifier for a product. A product is either a tangible or intangible good, and is a part of the business activities of a company. It can be traded and contributes directly or indirectly to value added. An example and instance is:

```
(a) Proprietary ID, Standard Agency
<ProductID schemeID="Domestic Appliances"
    schemeAgencyID="065055766"
        schemeAgencySchemeID="DUNS"
        schemeAgencySchemeAgencyID="016">
    B 1165 HS
</ProductID>
065055766 = Bosch at DUNS
016 = DUNS from Code List DE 3055
```

The structure of GDT ProductID 19000 is depicted in FIG. 190. ProductID connotes the type of product, instead of a concrete object. Thus, in the above example: B1165HS means a type of appliance, not an actual appliance with the serial number XY. The GDT ProductID 19000 includes attributes schemeID 19016, the schemeAgencyID 19034, schemeAgencySchemeID 19052, and schemeAgencySchemeAgencyID 19070. For the GDT ProductID 19000, the Object Class is Product 19002, the Property is Identification 19004, the Representation/Association term is Identifier 19006, the Type term is CCT 19008, the Type Name is Identifier 19010, and the Length is from one to sixty 19012. The GDT ProductID 19000 may be a restricted GDT.

A product contributes directly to the value creation if it is salable. A product contributes indirectly to value creation if it is necessary for selling another product, it supports the salability of another product, or it occurs in the business activity of a company and it is in the company's interest that this product adds value.

For the schemeID 19016, the Category is Attribute 19018, the Object Class is IdentificationScheme 19020, the Property is Identification 19022, the Representation/Association term is Identifier 19024, the Type term is xsd 19026, the Type Name term is Token 19028, and the Length is from one to sixty 19030. The Cardinality between the GDT ProductID 19000 and the schemeID 19016 is zero or one 15732. For the schemeAgencyID 19034, the Category is Attribute 19036, the Object Class is IdentificationSchemeAgency 19038, the Property is Identification 19040, the Representation/Association term is Identifier 19042, the Type term is xsd 19044, the Type Name term is Token 19046, and the Length is from one to sixty 19048. The Cardinality between the GDT ProductID 19000 and the schemeAgencyID 19034 is zero or one 19050. For the schemeAgencySchemeID 19052, the Category is Attribute 19054, the Object Class is IdentificationSchemeAgency 19056, the Property is Scheme 19058, the Representation/Association term is Identifier 19060, the Type term is xsd 19062, the Type Name term is Token 19064, and the Length is from one to sixty 19066. The Cardinality between the GDT ProductID 19000 and the schemeAgencySchemeID 19052 is zero or one 19068. For the schemeAgencySchemeAgencyID 19070, the Category is Attribute 19072, the Object Class is IdentificationSchemeAgency 19074, the Property is SchemeAgency 19076, the Representation/Association term is Identifier 19078, the Type term is xsd 19080, the Type Name term is Token 19082, and the Length is three 19084. The Cardinality between the GDT ProductID 19000 and the schemeAgencySchemeAgencyID 19070 is zero or one 19086.

(zzzzzz) ProductInternalID

A CDT ProductInternalID 19100 is a proprietary identifier for a product. A product is either a tangible or intangible good, and is a part of the business activities of a company. It can be traded and contributes directly or indirectly to value added. Examples (in SAP MDM)

GUID of a product:

<ProductInternalID schemeID="ProductGUID"schemeAgencyID="MPL__002">1C743CEC501F6A4D8826C7EC5A8554B9</ProductInternalID> schemeID="PartyGUID" indicates that the scheme "ProductGUID" was used to identify the product.

schemeAgencyID="MPL__002" indicates that the scheme was assigned by the business system "MPL__002."

Product ID of a product:

<ProductInternalID schemeID="ProductID" schemeAgencyID="MPL__002">VWPassat 01 0601 MPLCNT002</ProductInternalID>

The structure of CDT ProductInternalID 19100 is depicted in FIG. 191. The CDT ProductInternalID 19100 includes attributes schemeID 19118 and schemeAgencyID 19136. For the CDT ProductInternalID 19100, the Object Class is Product 19102, the Property Qualifier term is Internal 19104, the Property is Identification 19106, the Representation/Association term is Identifier 19108, the Type term is GDT 19110, the Type Name term is ProductID 19112, and the Length is from one to sixty 19114. The CDT ProductInternalID 19100 may be a restricted CDT.

The attributes of a CDT ProductInternalID 19100 may be filled as follows in an SAP MDM example.

For the schemeID 19118, the following schemes are provided: 1) ProductGUID, which identifies a product category via a Globally Unique Identifier; and 2) ProductID, which identifies a product category using an identifier. For the schemeID 19118, the Category is Attribute 19120, the Object Class is IdentificationScheme 19122, the Property is Identification 19124, the Representation/Association term is Identifier 19126, the Type term is xsd 19128, the Type Name term is Token 19130, and the Length is from one to sixty 19132. The Cardinality between the CDT ProductInternalID 19100 and the schemeID 19118 is zero or one 19134.

The schemeAgencyID 19136 is the business system in which the identifier was assigned. For the schemeAgencyID 19136, the Category is Attribute 19138, the Object Class is IdentificationSchemeAgency 19140, the Property is Identification 19140, the Representation/Association term is Identifier 19142, the Type term is xsd 19144, the Type Name term is Token 19146, and the Length is from one to sixty 19148. The Cardinality between the CDT ProductInternalID 19100 and the schemeAgencyID 19136 is zero or one 19150.

The CDT ProductInternalID 19100 represents a projection of the GDT ProductID, in which the attributes schemeID and schemeAgencyID are contained for describing an internally assigned ID. If an attribute is not explicitly assigned in the use of the GDT, it may be determined through the context.

The CDT ProductInternalID 19100 is used when both sender and recipient can access shared master data, e.g., during internal communication.

A product contributes directly to the value creation if it is salable. A product contributes indirectly to value creation if
- it is necessary for selling another product,
- it supports the salability of another product, or
- it occurs in the business activity of a company and it is in the company's interest that this product adds value.

In case the product is identified via the schema (schemeID), it should be noted that the product category may first be capable of being uniquely identified via a combined key (for example, the product category at an entity level can be uniquely identified (semantically) by using the ProductID, the ProductTypeID, the ObjectFamily and the logical system).

(aaaaaaa) CDT ProductPartyID

A CDT ProductPartyID 19200 is an identifier for a product assigned by a party. A product is either a tangible or intangible good, and is a part of the business activities of a company. It can be traded and contributes directly or indirectly to value added. An example of a CDT ProductPartyID 19200 is: <ProductSellerID>B 1165 HS</ProductSellerID>

The structure of ProductPartyID is depicted in FIG. 192. The CDT ProductPartyID 19200 is the proprietary identifier assigned by a business partner. The business partner, in its role, that assigned this identifier may derive from the business context of the message that the ProductPartyID uses. For the CDT ProductPartyID 19200, the Object Class is Product 19202, the Property Quality term is Party 19204, the Property is Identification 19206, the Representation/Association term is Identifier 19208, the Type term is GDT 19210, the Type Name term is ProductID 19212, and the Length is from one to sixty 19214. The CDT ProductPartyID 19200 may be a restricted CDT.

The use of the CDT ProductPartyID 19200, unlike the ProductStandardID, is role-dependent for example, as an ID assigned by the Buyer. The party is specified by its role. The term "Party" is replaced with the term "partner role type" for example, ProductSellerID. SchemeID and schemeVersionID are to be included as attributes as soon as there is a need to differentiate between several schemes. (See GDT ProductID 17500).

(bbbbbbb) ProductStandardID

A CDT ProductStandardID 19300 is a standardized identifier for a product, and the identification scheme may be managed by an agency from the code list DE 3055. A product is either a tangible or intangible good, and is a part of the business activities of a company. The product can be traded and contributes directly or indirectly to value added. An example of a CDT ProductStandardID 19300 is: <ProductStandardID schemeAgencyID="009">B 1165 HS</ProductStandardID>, wherein 009 is the EAN (International Article Numbering association) code.

The structure of GDT ProductStandardID 19300 is depicted in FIG. 193. The structure of GDT ProductStandard ID 19300 is depicted in FIG. 193. The GDT ProductStandard ID 19300 includes attributes schemeID 19318 and schemeAgencyID 19336. For the GDT ProductStandard ID 19300, the Object Class is Product 19302, the Property Qualifier term is Standard 19304, the Property is Identification 19306, the Representation/Association term is Identifier 19308, the Type term is GDT 19310, the Type Name term is ProductID 19312, and the Length is from one to fourteen 19314. The GDT ProductStandard ID 19300 may be a restricted GDT.

For the schemeID 19318, the Category is Attribute 19320, the Object Class is Identification Scheme 19322, the Property is Identification 19324, the Representation/Association term is Identifier 19326, the Type term is xsd 19328, the Type Name term is Token 19330, and the Length is from one to sixty 19332. The Cardinality between the GDT ProductStandard ID 19300 and the schemeID 19318 is zero or one 19334.

The "schemeAgencyID" 19336 identifies the agency that manages an identification scheme. The agencies from DE 3055 may be used as the default, but in an embodiment the roles defined in DE 3055 may no be used. At least the following two codes may be supported: 1) 009, which is the EAN.UCC, International Numbering Association code for the GTIN (Global Trade Item Number), which can have up to 14 characters; and 2) 005, which is the ISO, International Organization for Standardization code for the 13-character ISBN (International Standard Book Number). For ISBN, the code "005" (ISO) is entered for the schemeAgencyID 19336 along with the schemeID 19318 of "ISO 2108: 1992," which indicates that it is an ISBN. The ISBN scheme is managed by http://isbn-international.org/. Specifying a schemeID 19318 is not necessary if a scheme exists for an agency.

For the schemeAgencyID 19336, the Category is Attribute 19338, the Object Class is Identification Scheme Agency 19340, the Property is Identification 19342, the Representation/Association term is Identifier 19344, the Type term is xsd 19346, the Type Name term is Token 19348, and the Length is three 19350. The Cardinality between the CDT ProductStandard ID 19300 and the schemeAgencyID 19336 is one 19352.

Another standardized identification scheme is the pharmaceutical central number. There is no SchemeAgencyID 19336 for this in the code list DE 3055. How this will be represented may still be clarified. The structure of the GDTs HandlingUnit may be compatible with the "packaging" in the DELVRY03 IDoc.

The GDT ProductStandardID 19300 represents a projection of the GDT ProductID 19000, in which the attributes schemeID 19318 and schemeAgencyID 19336 are contained for describing an ID assigned by a standardization organization (i.e., an organization registered in DE 3055). The attribute schemeAgencyID 19336 may be a mandatory attribute.

Contrary to the ProductPartyID 19200, use of the ProductStandardID 19300 is not role dependent. SchemeVersionID is to be included as an attribute as soon as there is a need to differentiate between several schemes. (See GDT ProductID 19000).

(ccccccc) GDT ProductTax

A GDT ProductTax 19400 is a tax that is incurred during the sale, purchase, and consumption of products and during other related business transactions. An example of a ProductTax GDT 19400 used in TaxDueNotification, is as follows:

```
<ProductTax>
    <CountryCode>DE</CountryCode>
    <TypeCode>VAT</TypeCode>
    <TypeDescription>Value added tax</TypeDescription>
    <BaseAmount currencyCode="EUR">100</BaseAmount>
    <Percent>16</Percent>
    <Amount currencyCode="EUR">116</Amount>
    <BusinessTransactionDocumentItemGroupID>1
</BusinessTransactionDocumentItemGroupID>
  </ProductTax>.
```

The structure of the GDT ProductTax 19400 is depicted in FIG. 194. The structure of GDT ProductTax 19400 is depicted in FIG. 194. The GDT ProductTax 19400 includes elements CountryCode 19403, JurisdictionCode 19411, Type Code 19419, TypeDescription 19427, BaseAmount 19435, Percent 19443, Amount 19452, NonDeductiblePercent 19460, NonDeductibleAmount 19468, BusinessTransactionDocument ItemGroupID 19476, TriangulationIndicator 19484, and LegallyRequiredPhrase 19492. For the GDT ProductTax 19400, the Object Class is ProductTax 19401, and the Representation/Association term is Details 19402.

The CountryCode 19406 (ISO 3166-1) defines the country in which the tax is incurred. For the CountryCode 19403, the Category is Element 19404, the Object Class is ProductTax 19405, the Property is Country Code 19406, the Representation/Association term is Cod 19407, the Type term is GDT 19408, and the Type Name term is CountryCode 19409. The Cardinality between the GDT ProductTax 19400 and the CountryCode 19403 is zero or one 19410.

The JurisdictionCode 19422 is used for some countries (in particular the US) to identify the responsible tax authorities. For the JurisdictionCode 19411, the Category is Element 19412, the Object Class is ProductTax 19413, the Property is Tax Jurisdiction Code 19414, the Representation/Association term is Code 19415, the Type term is GDT 19416, and the Type Name term is TaxJurisdictionCode 19417. The Cardinality between the GDT ProductTax 19400 and the JurisdictionCode 19411 is zero or one 19418.

The TypeCode 19438 is a tax code, see GDT ProductTaxTypeCode. For the TypeCode 19419, the Category is Element 19420, the Object Class is ProductTax 19421, the Property is Type Code 19422, the Representation/Association term is Code 19423, the Type term is GDT 19424, and the Type Name term is ProductTaxTypeCode 19425. The Cardinality between the GDT ProductTax 19400 and the TypeCode 19419 is zero or one 19426.

The TypeDescription 19454 is a short description of tax, such as for the tax code "OTH—Other taxes, unspecified, miscellaneous tax charges." For the TypeDescription 19427, the 5 Category is Element 19428, the Property is Type Description 19430, the Representation/Association term is Text 19431, the Type term is GDT 19432, and the Type Name term is Description 19433. The Cardinality between the GDT ProductTax 19400 and the TypeDescription 19427 is zero or one 19434.

The BaseAmount 19470 is a Base amount on which tax was calculated (assessment basis). For the BaseAmount 19435, the Category is Element 19436, the Object Class is ProductTax 19437, the Property is Base Amount 19438, the Representation/Association term is Amount 19439, the Type term is GDT 19440m, and the Type Name term is Amount 19441. The Cardinality between the GDT ProductTax 19400 and the BaseAmount 19435 is zero or one 19442.

The Percent 19486 is a tax rate, or level of tax in percent. For the Percent 19443, the Category is Element 19444, the Object Class is ProductTax 19445, the Property is Percent 19446, the Representation/Association term is Percent 19447, the Type term is GDT 19448, and the Type Name term is Percent 19449. The Cardinality between the GDT ProductTax 19400 and the Percent 19443 is either zero or one 19450.

The Amount 19403 is a tax amount that is due for the underlying base amount. For the Amount 19451, the Category is Element 19452, the Object Class is ProductTax 19453, the Property is Amount 19454, the Representation/Association term is Amount 19455, the Type term is GDT 19456, and the Type Name term is Amount 19457. The Cardinality between the GDT ProductTax 19400 and the Amount 19451 is either zero or one 19458.

The NonDeductiblePercent 19419 is a percentage rate, portion, of tax that is non-deductible. For the NonDeductiblePercent 19459, the Category is Element 19460, the Object Class is ProductTax 19461, the Property is NonDeductiblePercent 19462, the Representation/Association term is Decimal 19463, the Type term is GDT 19464, and the Type Name term is Percent 19465. The Cardinality between the GDT ProductTax 19400 and the NonDeductiblePercent 19459 is zero or one 19466.

The NonDeductibleAmount 19435 is an amount of tax that is non-deductible. For the NonDeductibleAmount 19467, the Category is Element 19468, the Object Class is ProductTax 19469, the Property is NonDeductibleAmount 19470, the Representation/Association term is Amount 19471, the Type term is GDT 19472, and the Type Name term is Amount 19473. The Cardinality between the GDT ProductTax 19400 and the NonDeductibleAmount 19467 is zero or one 19474.

The BusinessTransactionDocumentItemGroupID 19451 groups items of a BusinessTransactionDocument that may be taxed in the same way. There is no global code list for the BusinessTransactionDocumentItemGroupID 19451, the possible values are arbitrary and may be used consistently within a document (e.g., an invoice). The BusinessTransactionDocumentItemGroupID 19451 can optionally be used to relate the taxes at item level to the summary tax lines at document level. The BusinessTransactionDocumentItemGroupID 19451 assists during invoice verification. For the BusinessTransactionDocument ItemGroupID 19475, the Category is Element 19476, the Object Class is ProductTax 19477, the Property is Business Transaction Document Item Group Identification 19478, the Representation/Association term is Identifier 19479, the Type term is GDT 19480, and the Type Name term is BusinessTransactionDocumentItemGroupID 19481. The Cardinality between the GDT ProductTax 19400 and the BusinessTransactionDocument ItemGroupID 19475 is zero or one 19482.

The TriangulationIndicator 19467 is a yes or no indicator that specifies whether the transaction is a triangular transaction. For the TriangulationIndicator 19483, the Category is Element 19484, the Object Class is ProductTax 19485, the Property is Triangulation 19486, the Representation/Association term is Indicator 19487, the Type term is CCT 19488, and the Type Name term is Indicator 19489. The Cardinality between the GDT ProductTax 19400 and the Triangulation-Indicator 19483 is zero or one 19490.

The LegallyRequiredPhrase 19438 is a legally required phrase that may be printed on the invoice. For the LegallyRequiredPhrase 19491, the Category is Element 19492, the Object Class is ProductTax 19493, the Property is Legally Required Phrase 19494, the Representation/Association term is Text 19495, the Type term is CCT 19496, the Type Name term is Text 19497, and the Length is one to two hundred fifty-six 19498. The Cardinality between the GDT ProductTax 19400 and the LegallyRequiredPhrase 19491 is zero or one 19499.

The segment GDT ProductTax 19400 is connected with an amount from which the base amount to be taxed is calculated. Rules on which taxes may be reported in summary form or at item level are country-dependent and are derived from the relevant legal requirements. For example, German sales tax may be reported in an invoice in summarized form for each tax rate. Non-deductible taxes are relevant for incoming invoices and credit memos. When a tax rate or tax amount is reported, the tax type the TypeCode 19438, may also be specified.

It is possible to tell from the BusinessTransactionDocumentItemGroupID 19451 how the individual items are taxed. If the items also report tax rate and tax amount, then the BusinessTransactionDocumentItemGroupID 19451 is superfluous. An example of an invoice with 3 items with German sales tax is shown in the following table:

| | Country | Type Code | Description | Base Amount | Percent | Amount | Item Group ID |
|---|---|---|---|---|---|---|---|
| Item 1 | | | | 100.00 EUR | | | A |
| Item 2 | | | | 200.00 EUR | | | B |
| Item 3 | | | | 300.00 EUR | | | A |
| Total A | DE | VAT | Sales Tax | 400.00 EUR | 16 | 64.00 EUR | A |
| Total B | DE | VAT | Sales Tax | 200.00 EUR | 7 | 14.00 EUR | B |

The GDT ProductTax 19400 is used to report different tax portions in invoice amounts or to initiate tax returns and payments of a company to the responsible tax authorities. A tax is a mandatory public payment that a community levies on natural and legal persons in its territory at a unilaterally fixed level (unlike fees and contributions) without providing a service in return. The tax jurisdiction code of a natural or legal person is part of the address data. The tax calculation depends on the tax jurisdiction code of the ship-from or ship-to party in certain countries, e.g., the US and Brazil.

(ddddddd) ProductTaxEventTypeCode

The GDT ProductTaxEventTypeCode 19500 is a coded representation of the tax event type that is linked to the purchase, sale or consumption of products. A tax event type refers to a combination of characteristics that are the basis for tax liability, tax relief measures, or tax exemptions of specific types and amounts, from the point of view of country-specific tax laws. An example or Instance of GDT ProductTaxEventTypeCode 19500 is:

<ProductTaxEventTypeCode>

DE101

</ProductTaxEventTypeCode>.

The structure of GDT ProductTaxEventTypeCode 19500 is depicted in FIG. 195.

Characteristics of the tax event types in terms of tax legislation are the subject of taxation, the legal entity that may pay tax, and the taxation object, the object, transaction or status of taxation. The type and number of tax event types to be taken into account for product taxes derive from the tax laws of a country. These laws or their provisions generally do not stipulate any specific codes, however. The codes may therefore be individually defined by the respective software manufacturers. The structure of GDT Product Tax Event Type Code 19500 is depicted in FIG. 195. For the GDT Product Tax Event Type Code 19500, the Object Class is Product Tax Event 19502, the Property is Type Code 19504, the Representation/Association term is Code 19506, the Type term is CCT 19508, the Type Name term is Code 19510, and the Length is from three to six 19512. The GDT Product Tax Event Type Code 19500 may be a restricted GDT.

In the GDT ProductTaxEventTypeCode 19500, the first two figures consist of the two-character ISO code 3166-1 for the country for which the tax matter is relevant, and is generally followed by a three-digit number from 100 to 999.

The GDT ProductTaxEventTypeCodes 19500 for Germany and the USA are listed in the following table:

| ProductTaxEventTypeCode | Description |
|---|---|
| DE100 | Non-taxable delivery |
| DE101 | Domestic delivery |
| DE102 | Intra-community delivery to recipient with VAT reg. no. |
| DE103 | Intra-community delivery of new vehicles to recipient without VAT reg. no. |
| DE104 | Intra-community delivery of new vehicles outside a company |
| DE105 | Tax-free delivery according to § 4 nos. 2 to 7 UStG (German taxation law) |
| DE106 | Tax-free delivery according to § 4 nos. 8 to 28 UStG (German taxation law) |

-continued

| ProductTaxEventTypeCode | Description |
|---|---|
| DE107 | Domestic delivery according to § 3c(3) UStG (German taxation law) (Distance selling) |
| DE110 | Export delivery (export to third country) |
| DE151 | Delivery by an agricultural or forestry company to the remaining community area to recipients with VAT reg. no. |
| DE152 | Domestic delivery by an agricultural or forestry company according to § 24(1)2 UStG (German taxation law) |
| DE200 | Non-taxable acquisition |
| DE201 | Domestic acquisition |
| DE202 | Tax-free intra-community acquisition according to § 4b UStG (German taxation law) |
| DE203 | Taxable intra-community acquisition of objects |
| DE204 | Taxable intra-community acquisition of other services |
| DE205 | Taxable intra-community acquisition of new vehicles from deliverers without VAT reg. no. |
| DE206 | Taxable intra-community acquisition according to delivery to first recipient in intra-community triangular transaction according to § 25b(2) UStG (German taxation law) |
| DE207 | Acquisition according to § 13b(2) UStG (German taxation law) (beneficiary owes tax) |
| DE210 | Import (import from third country) |
| DE301 | Posttax for taxed payments due to increased tax rate |
| DE302 | Authorization for input tax deduction according to § 15a UStG (German taxation law) |
| US100 | Non-taxable domestic sale |
| US101 | Taxable domestic sale |
| US110 | Export (not taxable) |
| US200 | Non-taxable domestic acquisition |
| US201 | Domestic acquisition use tax |
| US202 | Domestic acquisition sales tax |
| US210 | Import (taxable) |

The GDT ProductTaxEventTypeCode 19500 is used in tax calculation to determine the type and percentage rate of tax to be taken into account. Furthermore, based on the GDT ProductTaxEventTypeCode 19500, the tax register decides how and when the reported tax may be declared and paid to the tax authorities.

The GDT ProductTaxEventTypeCode 19500 may be a proprietary code list with fixed predefined values. Changes to the permitted values involve changes to the interface. In an embodiment, the GDT ProductTaxEventTypeCode 19500 is similar to the tax code in R/3 from a semantic point of view. In contrast to the tax code, however, the GDT ProductTaxEventTypeCode 19500 is independent of tax rates.

(eeeeeee) ProductTaxTypeCode

The GDT ProductTaxTypeCode 19600 is a coded representation of the type of a tax that is incurred during the sale, purchase, and consumption of products and during other related business transactions. An example of 19600 is: <ProductTaxTypeCode>VAT</ProductTaxTypeCode>

The structure of 19600 is depicted in FIG. 196. The structure of GDT Product Tax Type Code 19600 is depicted in FIG. 196. For the GDT Product Tax Type Code 19600, the Object Class is ProductTaxType 19602, the Property is Code 19604, the Representation/Association term is Code 19606, the Type term is CCT 19608, the Type Name term is Code 19610, and the Length is three 19612. The GDT Product Tax Type Code 19600 may be a restricted GDT.

The complete UN/EDIFACT code list "Duty or tax or fee Type code" is used for the values of the GDT ProductTaxTypeCode 19600. The GDT ProductTaxTypeCode 19600 is used for entering taxes, e.g., in invoices. The relevant types of product taxes for Germany and the US are, for example:

1) A Value added tax (VAT), which is a sales tax levied in Germany. The VAT also applies to all other EU countries and countries with comparable sales tax.

2) A State/provincial sales tax (STT), which is a sales tax levied by federal states in the USA; also applies to other federal countries with comparable tax.

3) Local sales tax (LOC), which is a sales tax levied by tax authorities in a state in the US, e.g., county sales tax, city sales tax. The LOC also applies to other federal countries with comparable tax.

(fffffff) ProductTypeCode

The GDT ProductTypeCode 19700 is a coded representation of the product type. A product type describes the nature of products and establishes the basic properties for products of this type. An example of 19700 is: <ProductTypeCode>1</ProductTypeCode>. The structure of GDT ProductTypeCode 19700 is depicted in FIG. 197. The structure of GDT ProductTypeCode 19700 is depicted in FIG. 197. For the GDT ProductTypeCode 19700, the Category is Element 19702, the Object Class is Product 19704, the Property is Type 19706, the Representation/Association term is Code 19708, the Type term is CCT 19710, the Type Name term is Code 19712, and the Length is from one to two 19714. The GDT ProductTypeCode 19700 may be a restricted GDT.

Some illustrative examples of the GDT ProductTypeCode 19700 are:

1) The number 1, which represents a Material. A material is a tangible product that can be created and thus represents a commercial value. A material's manufacture/production is time-independent from its consumption/use. A material can be traded; used in manufacture, consumed, or produced.

2) The number 2, which represents a Service product. A service product is an intangible product that describes the rendering of service. The rendering of a service coincides in time with its use.

The GDT ProductTypeCode 19700 determines the type of a product in more detail. It can be used in the context of a product instance or of a reference to a product instance in order to qualify this product instance, and can also be used in its own right. The GDT ProductTypeCode 19700 may be a proprietary code list with fixed predefined values. Changes to the permitted values involve changes to the interface.

The ProductTypeCode can be expanded with other product types if necessary, including for example:

3) The number 3, which represents a Financial Product. A financial product may be a series of incoming and outgoing payments based on a contract and for the purposes of investment or financing. Examples of a financial product are: Shares, bonds, loans, foreign exchange transactions or financial derivatives.

4) The number 4, which represents an Intellectual Property. Intellectual Property may be an intangible product of creative work. Intellectual Property includes, for example, a media title, if it is (art)work that is to be conveyed to a wide audience through the media.

5) The number 5, which represents a Warranty. A warranty may be a guarantee within a specified time period to be responsible for flaws or defects in a product sold. The type and scope of this service are specified in the warranty.

(ggggggg) PromotionID

A GDT PromotionID 19800 is a unique identifier for a promotion. A promotion is a marketing activity between the consumer goods industry and retail over a limited timeframe to increase brand capital, name recognition, and market share, to boost sales volumes, or to position new products or product groups. An example of 19800 is:

<PromotionID>72318</PromotionID>.

The structure of GDT PromotionID 19800 is depicted in FIG. 198. For the GDT PromotionID 19800, the Object Class is Promotion 19802, the Property is Identification 19804, the Representation/Association term is Identifier 19806, the Type term is CCT 19808, the Type Name term is Identifier 19810, and the Length is from one to thirty-five 19812. The GDT PromotionID 19800 may be a restricted GDT.

Role-based IDs (e.g., BuyerPromotionID, SellerPromotionID) based on the CCT identifier are used without additional attributes; they may be unique in connection with the identification of the business partner described by the role (e.g., BuyerID, SellerID). A promotion can have different objectives, e.g., to generate awareness of a new product, selectively increase demand for a certain brand, retain loyal customers, or fight competition, with various characteristics, e.g., price reductions, retail promotion, and promotional rebates.

GDT PromotionID 19800 is used in connection with cooperative business processes, in particular Vendor Managed Inventory (VMI) and Collaborative Planning, Forecasting and Replenishment (CPFR) to clearly identify a promotion between the business partners involved. Initially, one business partner, such as a retail company or a consumer goods manufacturer, informs the other partner of his identification of the promotion with a PromotionID. This identification can then be used as a reference in the downstream message exchange between the business partners.

(hhhhhhh) Property

A GDT Property 19900 is an object attribute. An example of 19900 is:

```
<Property>
    <ID schemeAgencyID="005">PROPERTY_1</ID>
    <DefinitionClassReference>
        <ID schemeAgencyID="005">DEFCLASS_01</ID>
        <VersionID>DEFCLASS_01</VersionID>
    </DefinitionClassReference>
    <PreferredName languageCode="EN">My first property
    </PreferredName>
    <PreferredName languageCode="DE">Mein erstes Merkmal
    </PreferredName>
    <PropertyDataTypeReference>DATATYPE_5
    </PropertyDataTypeReference>
</Property>.
```

The structure of GDT Property 19900 is depicted in FIG. 199. The GDT Property 19900 includes attribute ActionCode 19902, elements ID 19910, VersionID 19918, DefinitionClassReference 19926, RevisionID 19934, CreationDateTime 19944, VersionDateTime 19952, RevisionDateTime 19960, SubjectAreaCode 19968, PreferredName 19976, SynonymousName 19985, AbbreviationName 19994, DefiningDescription 19904*a*, AdditionalDescription 19913*a*, UsageDescription 19922*a*, PreferredSymbolNote 19931*a*, SynonymousSymbolNote 19940*a*, DefinitionSourceDocument WebAddress 19949*a*, IconAttachment 19958*a*, FigureAttachment 19966*a*, PropertyDataType 19974*a*, PropertyDataTypeReference 19982*a*, MeasureUnitMeaningCode 19990*a*, DependingPropertyReference 19998*a*, ConstrainingPropertyReference 19908*b*, AspectID 19917*b*, TargetInterfaceElementID 19926*b*, MultipleValueIndicator 19935*b*, TextSearchableIndicator 19944*b*, ParametricSearchableIndicator 19954*b*, and ValuationRequiredIndicator 19963*b*. For the GDT Property 19900, the Representation/Association term is Details 19901.

The ActionCode 19902 is an instruction to the recipient of a message telling it how to process a transmitted property. For the ActionCode 19902, the Category is Attribute 19903, the Object Class is Property 19904, the Property is Action 19905, the Representation/Association term is Code 19906, the Type term is GDT 19907, the Type Name term is ActionCode 19908. The Cardinality between the GDT Property 19900 and the ActionCode 19902 is zero or one 19909.

The ID 19910 is an unique identifier of the property. For the ID 19910, the Category is Element 19911, the Object Class is Property 19912, the Property is Identification 19913, the Representation/Association term is PropertyID 19914, the Type term is GDT 19915, the Type Name term is PropertyID 19916. The Cardinality between the GDT Property 19900 and the ID 19910 is one 19917.

The VersionID 19918 is an unique identifier for a version of the property. For the VersionID 19918, the Category is Element 19919, the Object Class is Property 19920, the Property is Version Identification 19921, the Representation/Association term is VersionID 19922, the Type term is GDT 19923, and the Type Name term is VersionID 19924. The Cardinality between the GDT Property 19900 and the VersionID 19918 is zero or one 19925.

The DefinitionClassReference 19926 is a reference to the definition class (or to a version of the definition class) of the property; if this reference exists, the property is unique within the specified definition class. For the DefinitionClassReference 19926, the Category is Element 19927, the Object Class is Property 19928, the Property is Definition Class Reference 19929, the Representation/Association term is PropertyDefinitionClassReference 19930, the Type term is GDT 19931, and the Type Name term is PropertyDefinitionClassReference 19932. The Cardinality between the GDT Property 19900 and the DefinitionClassReference 19926 is zero or one 19933.

The RevisionID 19934 is a revision number, that is, a sequential number that is assigned when changes are made. For the RevisionID 19934, the Category is Element 19935, the Object Class is Property 19936, the Property is Revision identification 19937, the Representation/Association term is Identifier 19938, the Type term is CCT 19939, the Type Name term is Identifier 19940, and the Length is from one to ten 19941. The Cardinality between the GDT Property 19900 and the RevisionID 19934 is zero or one 19942. The RevisionID may be a restricted CCT.

The CreationDateTime 19944 is a creation date/time stamp. For the CreationDateTime 19944, the Category is Element 19945, the Object Class is Property 19946, the Property is Creation 19947, the Representation/Association term is Date Time 19948, the Type term is GDT 19949, and the Type Name term is Date Time 19950. The Cardinality between the GDT Property 19900 and the CreationDateTime 19944 is zero or one 19951.

The VersionDateTime 19952 is a creation date/time stamp of this property version. For the VersionDateTime 19952, the Category is Element 19945, the Object Class is Property 19954, the Property is Version 19955, the Representation/Association term is Date Time 19956, the Type term is GDT 19957, and the Type Name term is Date Time 19958. The Cardinality between the GDT Property 19900 and the VersionDateTime 19952 is zero or one 19959.

The RevisionDateTime 19960 is a date/time stamp of the last change. For the RevisionDateTime 19960, the Category is Element 19961, the Object Class is Property 19962, the Property is Revision 19968, the Representation/Association term is Date Time 19964, the Type term is GDT 19965, and the Type Name term is Date Time 19966. The Cardinality between the GDT Property 19900 and the RevisionDateTime 19960 is zero or one 19967.

The SubjectAreaCode 19968 is a subject area in which the property can be used. (See GDT SubjectAreaCode). For the SubjectAreaCode 19968, the Category is Element 19969, the Object Class is Property 19970, the Property is Subject Area 19971, the Representation/Association term is Code 19972, the Type term is GDT 19973, and the Type Name term is SubjectAreaCode 19974. The Cardinality between the GDT Property 19900 and the SubjectAreaCode 19968 is zero or n 19975.

The PreferredName 19976 is a name of the property. There may be a maximum of one entry per language for the PreferredName 19976. For the PreferredName 19976, the Category is Element 19977, the Object Class is Property 19978, the Property Quality term is Preferred 19979, the Property is Name 19980, the Representation/Association term is Name 19981, the Type term is GDT 19982, and the Type Name term is Name 19983. The Cardinality between the GDT Property 19900 and the PreferredName 19976 is from one to n 19984.

The SynonymousName 19985 is a synonym name for the property. For the SynonymousName 19985, the Category is Element 19986, the Object Class is Property 19987, the Property Quality term is Synonymous 19988, the Property is Name 19989, the Representation/Association term is Name 19990, the Type term is GDT 19991, and the Type Name term is Name 19992. The Cardinality between the GDT Property 19900 and the SynonymousName 19985 is from zero to n 19993.

The AbbreviationName 19994 is an abbreviated property name. There may be a maximum of one entry per language for the AbbreviationName 19994. For the AbbreviationName 19994, the Category is Element 19995, the Object Class is Property 19996, the Property Quality term is Abbreviation 19997, the Property is Name 19998, the Representation/Association term is Name 19999, the Type term is GDT 19901 a, and the Type Name term is Name 19902*a*. The Cardinality between the GDT Property 19900 and the AbbreviationName 19994 is from zero to n 19903*a*.

The DefiningDescription 19904*a* is an unique definition of the property's meaning that makes it possible to uniquely distinguish the property from the other properties. A definition may be entered for each language. For the Defining/Description 19904*a*, the Category is Element 19905*a*, the Object Class is Property 19906*a*, the Property Quality term is Defining 19907*a*, the Property is Description 19908*a*, the Representation/Association term is Description 19909*a*, the Type term is GDT 19910*a*, and the Type Name term is Description 19911*a*. The Cardinality between the GDT Property 19900 and the Defining/Description 19904*a* is from zero to n 19912*a*.

The AdditionalDescription 19913*a* is an additional information about parts of the property which aids in the understanding of the property. For the AdditionalDescription 19913*a*, the Category is Element 19914*a*, the Object Class is Property 19915*a*, the Property Quality term is Additional 19916, the Property is Description 19917*a*, the Representation/Association term is Description 19918*a*, the Type term is GDT 19919*a*, and the Type Name term Description 19920*a*. The Cardinality between the GDT Property 19900 and the AdditionalDescription 19913*a* is from zero to n 19921*a*.

The UsageDescription 19922*a* is a free-text comment. The 19922*a* can be used to add explanatory text or general/individual notes. The comment may not supplement the definition; the description is used for this. The comment clarifies particular aspects concerning the use of a property. For the UsageDescription 19922*a*, the Category is Element 19923*a*, the Object Class is Property 19924*a*, the Property Quality term is Usage 19925*a*, the Representation/Association term is Description, the Type term is GDT 19928*a*, and the Type Name term is Description 19929*a*. The Cardinality between the GDT Property 19900 and the UsageDescription 19922*a* is from zero to n 19930*a*.

The PreferredSymbol 19931 a is a symbol for the property, such as "d" for diameter. For the PreferredSymbolNote 19931*a*, the Category is Element 19932*a*, the Object Class is Property 19933*a*, the Property Quality term is Preferred 19934*a*, the Property is Symbol 19935*a*, the Representation/Association term is Note 19936*a*, the Type term is GDT 19937*a*, and the Type Name term is Note 19938*a*. The Cardinality between the GDT Property 19900 and the PreferredSymbolNote 19931*a* is zero or one 19939*a*.

The SynonymousSymbolNote 19940*a* is a synonymous symbol for the property. For the SynonymousSymbolNote 19940*a*, the Category is Element 19941*a*, the Object Class is Property 19942*a*, the Property Quality term is Synonymal 19943*a*, the Property is Symbol 19944*a*, the Representation/Association term is Note 19945*a*, the Type term is GDT 19946*a*, and the Type Name term is Note 19947*a*. The Cardinality between the GDT Property 19900 and the SynonymousSymbolNote 19940*a* is zero or n 19948*a*.

The DefinitionSourceDocumentWebAddress 19949*a* is a reference to the original document from which the complete property definition or its meaning was taken. For the DefinitionSourceDocument WebAddress 19949*a*, the Category is Element 19950*a*, the Object Class is Property 19951*a*, the Property Quality term is DefinitionSource 19952*a*, the Property is Document 19953*a*, the Representation/Association term is WebAddress 19954*a*, the Type term is GDT 19955*a*, and the Type Name term is WebAddress 19956*a*. The Cardinality between the GDT Property 19900 and the DefinitionSourceDocument WebAddress 19949*a* is zero or one 19957*a*.

The IconAttachment 19958*a* is a preferred icon, that is, a character (alphanumeric character, symbol, or combination thereof) that conforms to international standards and that, particularly in formulas, represents the property in place of the property name. For the IconAttachement 19958*a*, the Category is Element 19959*a*, the Object Class is Property 19960*a*, the Property is Icon 19961*a*, the Representation/Association term is Attachment 19962*a*, the Type term is GDT 19963*a*, and the Type Name term is Attachment 19964*a*. The Cardinality between the GDT Property 19900 and the IconAttachment 19958*a* is zero or one 19965*a*.

The FigureAttachment 19966*a* is a link to a figure. For the FigureAttachment 19966*a*, the Category is Element 19967*a*, the Object Class is Property 19968*a*, the Property is FIG. 19969*a*, the Representation/Association term is Attachment 19970*a*, the Type term is GDT 19971*a*, and the Type Name term is Attachement 19972*a*. The Cardinality between the GDT Property 19900 and the FigureAttachment 19966*a* is zero or one 19973*a*.

The PropertyDataType 19974*a* is used if the data type of the property is defined for this property (local), then the GDT is embedded here. In this case, GlobalPropertyDataType is not used. For the PropertyDataType 19974*a*, the Category is Element 19975*a*, the Object Class is Property 19976*a*, the Property is Property Data Type 19977*a*, the Representation/Association term is PropertyDataType 19978*a*, the Type is GDT 19979*a*, and the Type Name term is PropertyDataType 19980*a*. The Cardinality between the GDT Property 19900 and the PropertyDataType 19974*a* is zero or one 19981*a*.

The PropertyDataTypeReference 19982*a* is used if an independent data type (global) is to be used for this property, then its identifier is specified here. In this case, LocalPropertyDataType is not used. For the PropertyDataTypeReference 19982*a*, the Category is Element 19983*a*, the Object Class is Property 19984*a*, the Property is Property Data Type Reference 19985*a*, the Representation/Association term is PropertyDataTypeReference 19986*a*, the Type term is GDT 19987*a*, and the Type Name term is PropertyDataTypeReference 19988*a*. The Cardinality between the GDT Property 19900 and the PropertyDataTypeReference 19982*a* is zero or one 19989*a*.

The MeasureUnitMeaningCode 199909*a* indicates the meaning of a physical unit. (See GDT MeasureUnitMeaningCode). For the MeasureUnitMeaningCode 19990*a*, the Category is Element 19991*a*, the Object Class is Property 19992*a*, the Property is Measure Unit Meaning 19993*a*, the Representation/Association term is Code 19994*a*, the Type term is GDT 19995*a*, and the Type Name term is MeasureUnitMeaningCode 19996*a*. The Cardinality between the GDT Property 19900 and the MeasureUnitMeaningCode 19990*a* is zero or one 19997*a*.

The DependingPropertyReference 19998*a* is, for a constraining property, the reference to the depending properties. For examples, the "temperature" property, which affects the measurement of a length, contains the key for the "length" property here, in the evaluation, the "temperature" property contains the temperature at which the length is to be measured. For the DependingPropertyReference 19998*a*, the Category is Element 19999*a*, the Object Class is Property 19901*b*, the Property Quality term is Depending 19902*b*, the Property is Property Identification 19903*b*, the Representation/Association term is PropertyIdentifcation 19904*b*, the Type term is GDT 19905*b*, and the Type Name term is PropertyReference 19906*b*. The Cardinality between the GDT Property 19900 and the DependingPropertyReference 19998*a* is from zero to n 19907*b*.

The ConstrainingPropertyReference 19908*b* is, for a depending property, the reference to the constraining properties. For example, the "length" property, which is dependent on the temperature, contains the key for the "temperature" property here; in the evaluation, the "temperature" property contains the temperature at which the length is to be measured. For the ConstrainingPropertyReference 19908*b*, the Category is Element 19909*b*, the Object Class is Property 19910*b*, the Property Quality term is Constraining 19911*b*, the Property is Property Identification 19912*b*, the Representation/Association term is PropertyIdentification 19913*b*, the Type term is GDT 19914*b*, and the Type Name term is PropertyReference 19915*b*. The Cardinality between the GDT Property 19900 and the ConstrainingPropertyReference 19908*b* is from zero to n 19916*b*.

The following elements may be used in the context of a catalogue:

The AspectID 19917*b* identifies an aspect for which the property is relevant. For the AspectID 19917*b*, the Category is Element 19918*b*, the Object Class is Property 19919*b*, the Property is Aspect Identification 19920*b*, the Representation/Association term is Identifier 19921*b*, the Type term is GDT 19922*b*, and the Type Name term is AspectID 19923*b*. The Cardinality between the GDT Property 19900 and the AspectID 19917*b* is form zero to n 19924*b*. The AspectID 19917 may be for the catalogue 19925*b*.

The TargetInterfaceElementID 48426*b* is the unique identifier of an element in an interface to which element the property can be assigned. For the TargetInterfaceElementID 19926*b*, the Category is Element 19927*b*, the Object Class is Property 19928*b*, the Property is Target Interface Element Identification 19929*b*, the Representation/Association term is Identifier 19930*b*, the Type term is GDT 19931*b*, and the Type Name term is InterfaceElementID 19932*b*. The Cardinality between the GDT Property 19900 and the TargetInterfaceElementID 19926*b* is from zero to n 19933*b*. The TargetInterface ElementID 19926*b* may be for the catalogue 19934*b*.

The MultipleValueIndicator 19935*b* indicates whether a property can contain a list of values or not. For the MultipleValueIndicator 19935*b*, the Category is Element 19936*b*, the Object Class is Property 19937*b*, the Property is Multiple Value Indication 19938*b*, the Representation/Association term is Indicator 19939*b*, the Type term is GDT 19940*b*, and the Type Name term is PropertyMultipleValueIndicator 19941*b*. The Cardinality between the GDT Property 19900 and the MultipleValueIndicator 19935*b* is zero or one 19942*b*. The MultipleValueIndicator 19935*b* may be for the catalogue 19943*b*.

The TextSearchableIndicatorm 19944 indicates whether a property is suitable for a text search or not. For the TextSearchableIndicator 19944*b*, the Category is Element 19946*b*, the Object Class is Property 19947*b*, the Property is TextSearchableIndication 19948*b*, the Representation/Association term is Indicator 19949*b*, the Type term is GDT 19950*b*, the Type Name term is TextSearchableIndicator 19951*b*. The Cardinality between the GDT Property 19900 and the TextSearchableIndicator 19944*b* is zero or one 19952*b*. The TextSearchableIndicator 19944*b* may be for the catalogue 19953*b*.

The ParametricSearchableIndicator 19954*b* indicates, whether a property is suitable for a parametric search or not. For the ParametricSearchableIndicator 19954*b*, the Category is Element 19955*b*, the Object Class is Property 19956*b*, the Property is Parametric Searchable Indication 19957*b*, the Representation/Association term is Indicator 19958*b*, the Type term is GDT 19959*b*, and the Type Name term is PropertyParametric SearchableIndicator 19960*b*. The Cardinality between the GDT Property 19900 and the ParametricSearchableIndicator 19954*b* is zero or one 19961*b*. The ParametricSearchableIndicator 19954*b* may be for the catalogue 19962*b*.

The ValuationRequiredIndicator 19963*b* indicates whether a value may be assigned for the property or not. For the ValuationRequiredIndicator 19963*b*, the Category is Element 19964*b*, the Object Class is Property 19965*b*, the Property is Valuation Required Indication 19966*b*, the Representation/

Association term is Indicator 19967*b*, the Type term is GDT 19968*b*, and the Type Name term is PropertyValuationRequiredIndicator 19969*b*. The Cardinality between the GDT Property 19900 and the ValuationRequiredIndicator 19963*b* is zero or one 19970*b*. The ValuationRequiredIndicator 19963*b* may be for the catalogue 19971*b*.

See, for example, ISO13584/42 (Definition of data model for properties) available from the GDT owner, for illustrative Integrity Conditions for the PropertyDataType 19900.

The property may have a data type. The data type can either be embedded under PropertyDataType 19900 or specified as a reference under PropertyDataType 19900.

The ISO13584/42 specifies that a property cannot be depending and constraining at the same time. This means that, in an embodiment, DependingPropertyReference 19998*a* and ConstrainingPropertyReference 19908*b* are not both be filled out.

Properties can be used for classification, for example.

Some elements that are mandatory in ISO13584/42 are optional in this scheme. This is intended to enable wider use of the scheme.

The attribute AdditionalDescription 19913*a* corresponds to the attribute Note in ISO; the attribute UsageDescription 19922*a* corresponds to the attribute Remark in ISO. ISO also contains an attribute that contains a formula describing the property. The GDT may not contain this attribute.

(iiiiii) PropertyDataType

A CDT PropertyDataType 20000 is the data type of a property. It describes the syntax of the values and can contain a list of permitted values. An example or instance of 20000 is as follows and describes a typical data type in character format and with a fixed length.

```
<PropertyDataType>
  <ID schemeAgencyID="005">MY_DATATYPE_01</ID>
  <VersionID>5</VersionID>
  <PreferredName languageCode='EN'>My first data
type</PreferredName>
  <Format>02</Format>
  <MaximumTotalDigits>13</MaximumTotalDigits>
  <LowerCaseAllowedIndicator>true</LowerCaseAllowedIndicator>
</PropertyDataType>
```

The following example of 20000 describes a data type in numeric format and with decimal places. Negative numbers are permitted, as are intervals. The following format is used: —,—,—.—.

```
<PropertyDataType>
  <ID schemeAgencyID="005">MY_DATATYPE_01</ID>
  <VersionID>5</VersionID>
  <PreferredName languageCode='EN'>My first data
type</PreferredName>
  <FormatCode>06</FormatCode>
  <MaximumTotalDigitsNumeric>13
  </MaximumTotalDigitsNumeric>
  <FractionalDigitsNumeric>5</FractionalDigitsNunmeric>
<NegativeValuesAllowedIndicator>true
</NegativeValuesAllowedIndicator>
  <IntervalValuesAllowedIndicator>true
  </IntervalValuesAllowedIndicator>
</PropertyDataType>.
```

The structure of CDT PropertyDataType 20000 is depicted in FIG. 200. The CDT PropertyDataType 20000 includes attribute ActionCode 20002 and elements ID 20010, VersionID 20018, PreferredName 20026, SynonymousName 20035, ShortName 20044, IconAttachment 20053, Description 20061, UsageDescription 20069, FormatCode 20078, LanguageDependencyIndicator 20086, MaximumTotalDigitNumberValue 20094, FractionalDigitNumberValue 20005*a*, LowerCaseAllowedIndicator 20015*a*, NegativeValueAllowedIndicator 20023*a*, MeasureUnitCode, CurrencyCode, ExponentialRepresentationTypeCode 20047*a*, ExponentintegerValue 20055*a*, IntervalValueIndicator 20064*a*, FractionalDigitPresentationAccuracyIndicator 20073*a*, RegularExpression 20082*a*, SeparatorUsageIndicator 20090*a*, TupelLengthValue 20098*a*, ComponentPropertyDefinition Class Reference 20008*b*, ComponentProperty 20017*b*, AllowedPropertyValueElement 20042*b*, and AllowedPropertyValuation 20084*b*. For the PropertyDataType 20000, the Representation/Association term is Details 20001.

The ActionCode 20002 is an instruction to the recipient of a message telling it how to process a transmitted property data type. For the ActionCode 20002, the Category is Attribute 20003, the Object Class is PropertyDataType 20004, the Property is Action 20005, the Representation/Association term is Code 20006, the Type term is GDT 20007, and the Type Name term is ActionCode 20008. The Cardinality between the PropertyDataType 20000 and the ActionCode 20002 is zero or one 20009.

The ID 20010 is an unique identifier of the data type. A data type can either be embedded in a property or defined as a dependent object, in which case, no identifier or names are specified. If a data type is to be used for several properties, it may have its own key and can have a name. For the ID 20010, the Category is Element 20011, the Object Class is PropertyDataType 20012, the Property is Identification 20013, the Representation/Association term is Identifier 20014, the Type term is GDT 20015, and the Type Name term is PropertyDataTypeID 20016. The Cardinality between the PropertyDataType 20000 and the ID 20010 is zero or one 20017.

The VersionID 20018 is an unique identifier for a version of the data type. For the VersionID 20018, the Category is Element 20019, the Object Class is PropertyDataType 20020, the Property is Version Identification 20021, the Representation/Association term is VersionID 20022, the Type term is GDT 20023, and the Type Name term is VersionID 20024. The Cardinality between the PropertyDataType 20000 and the VersionID is zero or one 20025.

The PreferredName 20026 is a name with, for example, one entry per language. For the Preferred Name 20026, the Category is Element 20027, the Object Class is PropertyDataType 20028, the Property Quality term is Preferred 20029, the Property is Name 20030, the Representation/Association term is Name 20031, the Type term is GDT 20032, and the Type Name term is Name 20033. The Cardinality between the PropertyDataType 20000 and the Preferred Name 20026.

The SynonymousName 20035 is a synonym for the data type. Several synonyms can be specified for each language. For the SynonymousName 20035, the Category is Element 20036, the Object Class is PropertyDataType 20037, the Property Quality term is Synonymous 20038, the Property is Name 20039, the Representation/Association term is Name 20040, the Type term is GDT 20041, and the Type Name term is Name 20042. The Cardinality between the PropertyDataType 20000 and the Preferred Name 20026 is from zero to n 20043.

The ShortName 20044 is a short name of the data type. One short name can be entered for each language. For the ShortName 20044, the Category is Element 20045, the Object Class is PropertyDataType 20047, the Property Quality term is Short 20047, the Property is Name 20048, the Representation/Association term is Name 20049, the Type term is GDT 20050, and the Type Name term is Name 20051. The Cardinality between the PropertyDataType 20000 and the ShortName 20044 is from zero to n 20052.

The IconAttachment 20053 is a preferred icon. A character (alphanumeric character, symbol, or combination thereof) that conforms to international standards and that, particularly in formulas, represents the data type in place of the data Type. For the IconAttachment 20053, the Category is Element 20054, the Object Class is PropertyDataType 20055, the Property is Icon 20056, the Representation/Association term is Attachment 20057, the Type term is GDT 20058, and the Type Name term is Attachment 20059. The Cardinality between the PropertyDataType 20000 and the IconAttachment is zero or one 20060.

The Description 20061 is an additional description for any parts of the definition class and that aids the understanding of the definition class. The description can supplement the definition. For the Description 20061, the Category is Element 20062, the Object Class is PropertyDataType 20063, the Property is Description 20064, the Representation/Association term is Description 20065, the Type term is GDT 20066, and the Type Name term is Description 20067. The Cardinality between the PropertyDataType 20000 and the Description 20061 is from zero to n 20068.

The UsageDescription 20069 is a description of aspects concerning the usage of the property. This can be an explanatory text or general/individual notes. For the Usage Description 20069, the Category is Element 20070, the Object Class is PropertyDataType 20071, the Property Quality term is Usage 20072, the Property is Description 20073, the Representation/Association term is Description 20074, the Type term is GDT 20075, and the Type Name term is Description 20076. The Cardinality between the PropertyDataType 20000 and the Usage Description 20069 is from zero to n 20077.

The FormatCode 20078 is a format of the data type; see GDT PropertyDataTypeFormatCode. For the FormatCode 20078, the Category is Element 20079, the Object Class is PropertyDataType 20080, the Property is Format 20081, the Representation/Association term is Code 20082, the Type term is GDT 20083, and the Type Name term is PropertyDataTypeFormatCode 20084. The Cardinality between the PropertyDataType 20000 and the FormatCode 20078 is zero or one 20085.

The LanguageDependencyIndicator 20086 values may not be language neutral. The default value is "false," i.e., values are language neutral. For the LanguageDependencyIndicator 20086, the Category is Element 20087, the Object Class is PropertyDataType 20088, the Property is Language Dependency 20089, the Representation/Association term is Indicator 20090, the Type term is GDT 20091, and the Type Name term is LanguageDependencyIndicator 20092. The Cardinality between the PropertyDataType 20000 and the LanguageDependencyIndicator 20086 is zero or one 20093.

The MaximumTotalDigitNumber 20094 is a total length, including decimal places. For the MaximumTotalDigitNumberValue 20094, the Category is Element 20095, the Object Class is PropertyDataType 20096, the Property Quality term is Maximum Total 20097, the Property is Digit Number 20098, the Representation/Association Quality term is Digit Number 20099, the Representation/Association term is Value **20001*a*, the Type term is GDT 20002*a*, and the Type Name term is DigitNumberValue 20003*a*. The Cardinality between the PropertyDataType 20000 and the MaximumTotalDigitNumberValue 20094 is zero or one 20004*a***.

The FractionalDigitNumber **20005*a* is a number of decimal places. For the FractionalDigitNumberValue 20005*a*, the Category is Element 20006, the Object Class is PropertyDataType 20007*a*, the Property Quality term is Fractional 20008*a*, the Property is Digit Number 20009*a*, the Representation/Association Quality term is Digit Number 20010*a*, the Representation/Association term is Value 20011*a*, the Type term is GDT 20012*a*, and the Type Name term is DigitNumberValue 20013*a*. The Cardinality between the PropertyDataType 20000 and the FractionalDigitNumberValue 20005*a* is zero or one 20014*a***.

The LowerCaseAllowedIndicator **20015*a* indicates whether or not lowercase entries are allowed. The default value is "false," i.e., lowercase values are not allowed. For the LowerCaseAllowedIndicator 20015*a*, the Category is Element 20016*a*, the Object Class is PropertyDataType 20017*a*, the Property is Lower Case Allowed 20018*a*, the Representation/Association term is Indicator 20019*a*, the Type term is GDT 20020*a*, and the Type Name term is Indicator 20021*a*. The Cardinality between the PropertyDataType 20000 and the LowerCaseAllowedIndicator 20015*a* is zero or one 20022*a***.

The NegativeValueAllowedIndicator **20023*a* indicates whether or not negative values are allowed. The default value is "false," i.e., negative values are not allowed. For the NegativeValueAllowedIndicator 20023*a*, the Category is Element 20024*a*, the ObjectClass term is PropertyDataType 20025*a*, the Property is Negative Value Allowed 20026*a*, the Representation/Association term is Indicator 20027*a*, the Type term is GDT 20028*a*, and the Type Name term is Indicator 20029*a*. The Cardinality between the PropertyDataType 20000 and the NegativeValueAllowedIndicator 20015*a* is zero or one 20030*a***.

The MeasureUnitCode **20031*a* is a coded representation of a non-monetary unit of measurement; see GDT MeasureUnitCode. For the MeasureUnitCode 20031*a*, the Category is Element 20032*a*, the Object Class is PropertyDataType 20033*a*, the Property is Measure Unit 20034*a*, the Representation/Association term is Code 20035*a*, the Type term is GDT 20036*a*, and the Type Name term is MeasureUnitCode 20037*a*. The Cardinality between the PropertyDataType 20000 and the MeasureUnitCode 20031*a* is zero or one 20038*a***.

The CurrencyCode **20039*a* is a currency of the data type; see GDT CurrencyCode. For the CurrencyCode 20039*a*, the Category is Element 20040*a*, the Object Class is PropertyDataType 20041*a*, the Property is Currency 20042*a*, the Representation/Association term is Code 20043*a*, the Type term is GDT 20044*a*, and the Type Name term is CurrencyCode 20045*a*. The Cardinality between the PropertyDataType 20000 and the CurrencyCode 20039*a* is zero or one 20046*a***.

The ExponentialRepresentationTypeCode **20047*a* is a type of exponential representation; see GDT ExponentialRepresentationTypeCode. For the ExponentialRepresentationTypeCode 20047*a*, the Category is Element 20048*a*, the Object Class is PropertyDataType 20049*a*, the Property is ExponentialRepresentationType 20049*a*, the Representation/Association term is Code 20051*a*, the Type term is GDT 20052*a*, and the Type Name term is ExponentialRepresentationTypeCode 20053*a*. The Cardinality between the PropertyDataType 20000 and the ExponentialRepresentationTypeCode 20047*a* is zero or one 20054*a***.

The ExponentIntegerValue **20055*a* is an exponent value for exponential representation with predefined exponents. For the ExponentIntegerValue 20055*a*, the Category is Element 20056*a*, the Object Class is PropertyDataType 20057*a*, the Property is Exponent 20058*a*, the Representation/Association Quality term is Integer 20059***a*, the Representation/Association term is Value 20060*a*, the Type term is GDT 20061*a*, and the Type Name term is IntegerValue 20062*a*. The Cardinality between the PropertyDataType 20000 and the ExponentIntegerValue 20055*a* is zero or one 20063*a*.

The IntervalValueAllowedIndicator 20064*a* indicates whether or not interval values are allowed (the interval is classed as one value in the value list.) The default value may be "false," i.e., interval values are not allowed. For the IntervalValueAllowedIndicator 20064*a*, the Category is Element 20065*a*, the Object Class PropertyDataType 20066*a*, the Property Quality term is Interval 20067*a*, the Property is Value Allowed 20068*a*, the Representation/Association term is Indicator 20069*a*, the Type term is GDT 20070*a*, and the Type Name term is Indicator 20071*a*. The Cardinality between the PropertyDataType 20000 and the IntervalValueAllowedIndicator 20064*a* is zero or one 20072*a*.

The FractionalDigitPresentationAccuracyIndicator 20073*a* indicates whether or not the number of decimal places of numeric values follows the entry under FractionalDigitsNumeric or the actual user entry. Example: three decimal places, entry 2.40; if this switch is not set, the entry is formatted as 2.400, if the switch is set, the format remains as 2.40. The default value may be "false," i.e. FractionalDigitsNumeric is deciding. For the FractionalDigitPresentationAccuracyIndicator 20073*a*, the Category is Element 20074*a*, the Object Class is PropertyDataType 20075*a*, the Property Quality term is Fractional Digit 20076*a*, the Property is Presentation Accuracy 20077*a*, the Representation/Association term is Indicator 20078*a*, the Type term is GDT 20079*a*, and the Type Name term is Indicator 20080*a*. The Cardinality between the PropertyDataType 20000 and the FractionalDigitPresentationAccuracyIndicator 20073*a* is zero or one 20081*a*.

The RegularExpression 20082*a* is a formula that describes the data type, e.g., for a data type for density, this could indicate that the density is the quotient of mass and volume. For the RegularExpression 20082*a*, the Category is Element 20083*a*, the Object Class is PropertyDataType 20084*a*, the Property is Regular Expression 20085*a*, the Representation/Association term is Text 20086*a*, the Type term is GDT 20087*a*, and the Type Name term is Note 20088*a*. The Cardinality between the PropertyDataType 20000 and the RegularExpression 20082*a* is zero or one 20089*a*.

The SeparatorUsageIndicator 20090*a* indicates whether or not thousand separators are to be used in numeric formats. The default value is "true"—thousand separators are used. For the SeparatorUsageIndicator 20090*a*, the Category is Element 20091*a*, the Object Class is PropertyDataType 20092*a*, the Property is Separator Usage 20093*a*, the Representation/Association term is Indicator 20094*a*, the Type term is GDT 20095*a*, and the Type Name term is Indicator 20096*a*. The Cardinality between the PropertyDataType 20000 and the SeparatorUsageIndicator 20090*a* is zero or one 20097*a*.

The TupelLengthValue 20098*a* if the data type is used to record measured values, minimum, maximum, and average values, e.g., need to be recorded, since a single value is generally not sufficient; these values have the same format. In this case, the TupelLengthValue can be used to specify that a value data set is required. In the example, a 3-tupel is required for specifying values. If this attribute is not specified, the values are single values. For the TupelLengthValue 20098*a*, the Category is Element 20099*a*, the Object Class is PropertyDataType 20001*b*, the Property is Tupel Length 20002*b*, the Representation/Association Quality term is Tupel Length 20003*b*, the Representation/Association term is Value 20004*b*, the Type term is GDT 20005*b*, and the Type Name is TupelLengthValue 20006*b*. The Cardinality between the PropertyDataType 20000 and the TupelLengthValue 20098*a* is zero or one 20007*b*.

The ComponentPropertyDefinitionClassReference 20008*b* is used in the case of complex data types. This is the reference to the definition class (or to a version of the definition class) that contains the sub properties of the complex data type. If a definition class is not used, the properties contained are specified under ComponentPropertyReference instead. For the ComponentPropertyDefinition ClassReference 20008*b*, the Category is Element 20009*b*, the Object Class is PropertyDataType 20010*b*, the Property Quality term is Component 20011*b*, the Property is Property Definition Class Reference 20012*b*, the Representation/Association term is PropertyDefinition ClassReference 20013*b*, the Type term is GDT 20014*b*, and the Type Name term is PropertyDefinition ClassReference 20015*b*. The Cardinality between the PropertyDataType 20000 and the ComponentPropertyDefinition ClassReference 20008*b* is zero or one 20016*b*.

The ComponentProperty 20017*b* is in the case of complex data types, these are the properties that form the components of the complex data type and the attributes related to this assignment. For the ComponentProperty 20017*b*, the Category is Element, the Object Class is PropertyDataType 20019*b*, the Property Quality term is Component 20020*b*, the Property is Property Reference 20021*b*, the Representation/Association term is PropertyReference 20022*b*, the Type term is GDT 20023*b*, and the Type Name is PropertyReference 20024*b*. The Cardinality between the PropertyDataType 20000 and the ComponentProperty 20017*b* is zero or n 20025*b*.

The ComponentPropertyReference 20026*b* is if a complex data type is modeled, but no definition class is used, these are the identifiers of the properties that form the complex data type. A complex data type may contain at least two properties. For the ComponentProperty 20017*b* Reference 20026*b*, the Category is Element 20027*b*, the Object Class is ComponentProperty 20028*b*, the Property is Property Reference 20029*b*, the Representation/Association term is PropertyReference 20030*b*, the Type term is GDT 20031*b*, and the Type Name term is PropertyReference 20032*b*. The Cardinality between the PropertyDataType 20000 and the ComponentProperty 20017*b* Reference 20026*b* is one 20033*b*.

The PropertyOrdinalNumberValue 20034*b* is a position of a given property in the list of component properties. The sequence of this property list is specified by the required display sequence of the properties. For the ComponentProperty 20017*b* OrdinalNumberValue 20034*b*, the Category is Element 20035*b*, the Object Class is ComponentProperty 20036, the Property is Ordinal Number 20037*b*, the Representation/Association term is Value 20038*b*, the Type term is GDT 20039*b*, and the Type Name term is OrdinalNumberValue 20040*b*. The Cardinality between the PropertyDataType 20000 and the ComponentProperty 20017*b* OrdinalNumberValue 20034*b* is zero or one 20041*b*.

The AllowedPropertyValueElement 20042*b* is a data type value that is allowed in an evaluation of the associated property. If no value is specified, there are no restrictions in terms of the values allowed in an evaluation (with the exception of the format specifications for the data type). For the AllowedPropertyValueElement 20042*b*, the Category is Element 20043*b*, the Object Class is PropertyDataType 20044*b*, the Property Quality term is Allowed 20045*b*, the Property is PropertyValueStructure 20046*b*, and the Representation/Association term is Details 20047*b*. The Cardinality between the PropertyDataType 20000 and the AllowedPropertyValueElement 20042*b* is from zero to n 20048*b*.

The AllowedPropertyValue 20049*b* is the value allowed. For the AllowedPropertyValueElement 20042*b* PropertyValue 20049*b*, the Category is Element 20050*b*, the Object Class is PropertyValueStructure 20051*b*, the Property is PropertyValue 20052*b*, the Representation/Association term is PropertyValue 20053*b*, the Type term is GDT 20054*b*, and the Type Name term is PropertyValue 20055*b*. The Cardinality between the PropertyDataType 20000 and the AllowedPropertyValueElement 20042*b* PropertyValue 20049*b* is one 20056*b*.

The DefaultValueIndicator 20057*b* indicates whether or not the value or value interval is a standard value or standard value interval. The format and value range are defined by the GDT Indicator. The default value may be "false," i.e., the value is not a standard value. For the AllowedPropertyValueElement 20042*b* DefaultValueIndicator 20057*b*, the Category is Element 20058*b*, the Object Class is PropertyValueStructure 20059*b*, the Property is DefaultValue 20060*b*, the Representation/Association term is Indicator 20061*b*, the Type term is GDT 20062*b*, and the Type Name term is Indicator 20063*b*. The Cardinality between the PropertyDataType 20000 and the AllowedPropertyValueElement 20042*b* DefaultValueIndicator 20057*b* is zero or one 20064*b*.

The NetElementID 20065*b* identifies the current value or value interval in a value hierarchy. The ID is allocated sequentially in whole numbers in the value list. NetElementID is type CCT: Identifier. For the AllowedPropertyValueElement 20042*b* NetElementID 20065*b*, the Category is Element 20066*b*, the Object Class is PropertyValueStructure 20067*b*, the Property is NetElementIndentification 20068*b*, the Representation/Association term is Identifier 20069*b*, the Type term is CCT 20070*b*, and the Type Name term is Identifier 20071*b*. The Length is five 20072. The Cardinality between the PropertyDataType 20000 and the AllowedPropertyValueElement 20042*b* NetElementID 20065*b* is zero or one 20073*b*.

The PreceedingNetElementID 20074*b* identifies a preceding value or preceding value interval in the value hierarchy. There can be several preceding values or value intervals. PreceedingNetElementID is type CCT: Identifier. For the PreceedingNetElementID 20074*b*, the Category is Element, the Object Class is PropertyValueStructure 20076*b*, the Property Quality term is Preceding 20077*b*, the Property is NetelmentIdentification 20078*b*, the Representation/Association term is Identifier 20079*b*, the Type term is CCT 20080*b*, and the Type Name term is Identifier 20081*b*. The Length is five 20082*b*. The Cardinality between the PropertyDataType 20000 and the AllowedPropertyValueElement 20042*b* PreceedingNetElementID 20074*b* is from zero to n 20083*b*.

The AllowedPropertyValuation 20084*b* is used if the data type is a complex data type. It may not have a direct value list. The values allowed result from the valuation of the components of the complex data type. This valuation is specified in AllowedPropertyValuation. For the AllowedPropertyValuation 20084*b*, the Category is Element 20085*b*, the Object Class is PropertyDataType 20086*b*, the Property Quality term is Allowed 20087*b*, the Property is Property Valuation 20088*b*, the Representation/Association term is PropertyValuation 20089*b*, the Type term is GDT 20090*b*, and the Type Name is PropertyValuation 20091*b*. The Cardinality between the PropertyDataType 20000 and the AllowedPropertyValuation 20084*b* is from zero to n 20092*b*.

See ISO13584/42 (Definition of data model for properties), available from the GDT owner, for illustrative Integrity Conditions for 20000.

There are a number of consistency conditions for the individual fields; illustrative consistency conditions are: 1) a LanguageDependencyIndicator, which is for character format; 2) a MaximumTotalDigitNumber, which is exactly 1 for Boolean values and not set for character strings of unlimited length and complex data types; 3) a FractionalDigitsNumber for decimal numbers and exponential numbers. The FractionalDigitsNumber is shorter than the total length; 4) a LowerCaseAllowedIndicator for character format; 5) a NegativeValueAllowedIndicator for whole numbers, decimal numbers, exponential numbers, and currency format; 6) a ExponentialRepresentationTypeCode for exponential format; 7) a ExponentInteger for ExponentialRepresentationTypeCode equal to 02; 8) a IntervalValueAllowedIndicator for whole numbers, decimal numbers, exponential numbers, and currency format; 9) a FactionalDigitsPresentationAccuracyIndicator for decimal numbers and exponential numbers; 10) a SeparatorUsageIndicator for whole numbers, decimal numbers, exponential numbers, and currency format; 11) a TupelLengthNumber for integers, decimal numbers, and exponential numbers; 12) an AllowedPropertyValue which can be filled for simple data types; and 13) an AllowedPropertyValuation can be filled for complex data types. If the data type contains a value list, the values contained in the list may satisfy the value syntax defined in the data type. In the case of complex data types, either the identifier for the area of application (ComponentPropertyDefinitionClassReference) or the list of the components contained (ComponentPropertyReference) is used.

The data type is specified for a property in order to define its format and allowed values. If the data type does not contain a value list, any value that satisfies the format described in the data type is allowed for the assigned property. A data type can be created explicitly with an external key. Such data types can be assigned to several properties. Alternatively, a data type can be created implicitly when a property is created; in this case, the data type can be used for this particular property and that it can be changed on the basis of this particular property.

The data type defined here is not to be confused with a DDIC data type. In an embodiment, it contains particular properties, does not cover all of the attributes of a DDIC data type, and is linked to ISO13584/42. Some elements that are mandatory in ISO13584/42 are optional in this scheme (such as, the optional use of the definition class in the case of complex data types). This is provides wider use of the scheme. The attribute Description corresponds to the attribute Note in ISO and the attribute UsageDescription 20069 corresponds to the attribute Remark in ISO.

For the NetElementID 20065*b* and the PreceedingNetElementID 20074*b*, when the values allowed for the property are defined, they can be arranged in hierarchies in order to simplify navigation and value selection. A value can have several predecessors. For example, the values of the property 'country' are to be arranged by continent. For example, Great Britain is to be grouped under North America as well as under Europe. In an example, this would appear as shown in the following table:

| Value Index | Value | ID of Predecessor |
|---|---|---|
| 1 | Europe | |
| 2 | North America | |
| 3 | Germany | 1 |
| 4 | US | 2 |
| 5 | Great Britain | 1, 2 |

(jjjjjjj) PropertyDataTypeFormatCode

The GDT PropertyDataTypeFormatCode 20100 is a coded representation of the format of a property data type. An example of 20100 is:

<PropertyDataTypeFormatCode>date</PropertyDataTypeFormatCode>.

The structure of GDT PropertyDataTypeFormatCode 20100 is depicted in FIG. 201. For the GDT PropertyDataTypeFormatCode 20100, the Object Class is Property Data Type 20102, the Property is Format 20104, the Representation/Association term is Code 20106, the Type term is CCT 20108, the Type Name term is Code 20110, and the Length is ten 20112. The GDT PropertyDataTypeFormatCode 20100 may be a restricted GDT.

The values for 20100 may come from the data type system defined by W3C (http://www.w3.org/TR/xmlschema-2/#built-in-datatypes). The list contains those data types of the W3C data type system that are used for classification purposes.

The Code Boolean has the Name Boolean and has the value space to support the mathematical concept of binary-valued logic: {true, false}.

The Code complex has the Name complex and is a data type comprising several simple or complex data types.

The Code date has the Name date and represents a calendar date. The value space of date is the set of Gregorian calendar dates as defined in §5.2.1 of [ISO 8601]. For example it may be a set of one-day long, non-periodic instances e.g. lexical 1999-10-26 to represent the calendar date 1999-10-26, independent of how many hours this day has.

The Code decimal has the Name decimal and represents arbitrary precision decimal numbers. The value space of decimal is the set of the values i×10ˆ−n, where i and n are integers such that n>=0. The order-relation on decimal is: x<y iff y−x is positive.

The Code float has the Name float and corresponds to the IEEE single-precision 32-bit floating point type [IEEE 754-1985]. The basic value space of float consists of the values m×2ˆe, where m is an integer whose absolute value is less than 2ˆ24, and e is an integer from 149 to 104, inclusive. In addition to the basic value space described above, the value space of float also contains the following special values: positive and negative zero, positive and negative infinity and not-a-number. The order-relation on float is: x<y iff y−x is positive. Positive zero is greater than negative zero. Not-a-number equals itself and is greater than all float values including positive infinity.

The Code integer has the Name integer and is derived from decimal by fixing the value of fractionDigits to be 0. This results in the standard mathematical concept of the integer numbers. The value space of integer is the infinite set { . . . ,−2,−1,0,1,2, . . . }. The base type of integer is decimal.

The Code string has the Name string and represents character strings in XML. The value space of string is the set of finite-length sequences of characters (as defined in [XML 1.0 (Second Edition)]) that•match•the Char production from [XML 1.0 (Second Edition)]. A character is an atomic unit of communication; it is not further specified except to note that every character has a corresponding Universal Character Set code point, which is an integer.

The Code time has the Name time and represents an instant of time that recurs every day. The value space of time is the space of time of day values as defined in §5.3 of [ISO 8601]. Specifically, it may be a set of zero-duration daily time instances.

The Code dateTime has the Name dateTime and represents a specific instant of time. The value space of dateTime is the space of Combinations of date and time of day values as defined in §5.4 of [ISO 8601].

The Code any URI has the Name any URI and represents a Uniform Resource Identifier Reference (URI). An any URI value can be absolute or relative, and may have an optional fragment identifier (i.e., it may be a URI Reference). This type should be used to specify the intention that the value fulfills the role of a URI as defined by [RFC 2396], as amended by [RFC 2732].

The type is used in the GDT PropertyDataType 20100. The Code establishes which formats are possible for a data type entry and how associated values are transferred and stored. The valuations for the formats (e.g., the number of decimal places) are specified in the GDT PropertyDataType 20100.

(kkkkkkk) PropertyDataTypeID

A GDT PropertyDataTypeID 20200 is a unique identifier for a property data type. PropertyDataType is the data type of a property. It describes the syntax of the property values and can contain a list of permitted values. An example of 20200 is:

<PropertyDataTypeID schemeAgencyID=‘005’>MY_DATATYPE__01</PropertyDataTypeID>.

The structure of GDT PropertyDataTypeID 20200 is depicted in FIG. 202. (See CCT Identifier). The GDT PropertyDataTypeID 20200 includes attributes SchemeAgencyID 20216, SchemeAgencySchemeID 20234, and schemeAgencySchemeAgencyID 20252. For the GDT PropertyDataTypeID 20200, the Object Class is Property Data Type 20202, the Property is Identification 20204, the Representation/Association term is Identifier 20206, the Type term is CCT 20208, the Type Name term is Identifier 20210, and the Length is from one to fifty 20212. The GDT PropertyDataTypeID 20200 may be a restricted GDT.

For the SchemeAgencyID 20216, the Category is Attribute 20218, the Object Class is Identification Scheme-Agency 20220, the Property is Identification 20222, the Representation/Association term is Identifier 20224, the Type term is xsd 20226, the Type Name term is Token 20228, and the Length is from one to sixty 20230. The Cardinality between the GDT PropertyDataTypeID 20200 and the SchemeAgencyID 20216 is one 20232. For the SchemeAgencySchemeID 20234, the Category is Attribute 20236, the Object Class is Identification Scheme-Agency 20238, the Property is Scheme 20240, the Representation/Association term is Identifier 20242, the Type term is xsd 20244, the Type Name term is Token 20246, and the Length is from one to sixty 20248. The Cardinality between the GDT PropertyDataTypeID 20200 and the SchemeAgencySchemeID 20234 is zero or one 20250.

For the schemeAgencySchemeAgencyID 20252, the Category is Attribute 20254, the Object Class is Identification Scheme-Agency 20256, the Property is Scheme Agency 20258, the Representation/Association term is Identifier 20260, the Type term is xsd 20262, the Type Name term is Token 20264, and the Length is three 20266. The Cardinality between the GDT PropertyDataTypeID 20200 and the schemeAgencySchemeAgencyID 20252 is zero or one 20268.

The GDT is used to assign an independently defined data type to a property. The concept is defined in ISO13584/42.

The GDT PropertyDataTypeReference 20200 is used to reference a version of a property data type.

Related GDTs are: PropertyID, Property, DefinitionClassID, DefinitionClass, PropertyValues, and PropertyValuation (lllllll) PropertyDataTypeReference A GDT PropertyDataTypeReference 20300 is a unique reference to a property data type or a version of a property data type. PropertyDataType is the data type of a property. It describes the syntax of the property values and can contain a list of permitted values. An example of the 20300 is:

```
<PropertyDataTypeReference>
  <ID schemeAgencyID="005">MY_DATATYPE_01</ID>
  <VersionID>1</VersionID>
</PropertyDataTypeReference>
  (005=ISO).
```

The structure of GDT PropertyDataTypeReference 20300 is depicted in FIG. 203. The GDT PropertyDataTypeReference 20300 includes elements ID and VersionID. For the GDT PropertyDataTypeReference 20300, the Object Class is Property Data Type Reference 20302 and the Representation/Association term is Details 20304.

The ID 20306 is the identifier of the property data type. For the ID 20306, the Category is Element 20308, the Object Class is Property Data Type Reference 20310, the Property is Identification 20312, the Representation/Association term is Identifier 20314, the Type term is GDT 20316, and the Type Name term is PropertyDataTypeID 20318. The Cardinality between the GDT PropertyDataTypeReference 20300 and the ID 20306 is one.

The VersionID 20320 is the version of the property data type. For the VersionID 20320, the Category is Element 20322, the Object Class is Property Data Type Reference 20324, the Property is Version Identification 20326, the Representation/Association term is Identifier 20328, the Type term is GDT 20330, and the Type Name term is VersionID 20332. The Cardinality between the GDT PropertyDataTypeReference 20300 and the VersionID 20320 is zero or one 20334.

For information about the property data type, see GDT PropertyDataType 20000.

(mmmmmmm) PropertyDefinitionClass

A GDT PropertyDefinitionClass 20400 is a class for defining properties in a classification system. A PropertyDefinitionClass 20400 defines a subject area. The properties defined in a PropertyDefinitionClass represent the attributes of this subject area. The PropertyDefinitionClass 20400 is not used directly for classifying objects. For this purpose, classes are defined that use the properties defined in a PropertyDefinitionClass 20400.

The PropertyValuation environment, and relationships to other objects, is discussed below.

"Simple" properties are described first. A property definition class can contain one or more properties. A property can have property valuations, each of which assigns one or more property values to a property. A property is typed by a property data type, which specifies the possible property values for the property valuations. The values permitted by the property data type can be specified by listing the values in "PropertyValue."

Complex properties can also be defined. A complex property data type can be used to define a complex property by referencing to a property definition class. The property definition class contains several properties that structure the complex property data type. The properties are then typed by property data types. Properties can also be defined without a property definition class. In this case, each property is defined globally, i.e., the "area of application" of the properties is not specified by the property definition class. A PropertyValuation is used to valuate properties for any objects, or to assign values to properties.

An example or instance is:

```
<PropertyDefinitionClass>
  <ID schemeAgencyID="005">SCREW_PROPERTIES</ID>
  <VersionID>1</VersionID>
  <PreferredName languageCode='EN'>
      'Properties for screw description'
  </PreferredName>
      <ShortName languageCode='EN'>
          'Screws'
      </ShortName>
      <DefinedProperty>
          <Reference>
              <ID schemeAgencyID="005">LENGTH</ID>
              <VersionID>1</VersionID>
              <DefinitionClassReference>
                  <ID>SCREW_PROPERTIES</ID>
                  <VersionID>1</VersionID>
              </DefinitionClassReference>
          </Reference>
      </DefinedProperty>
      <DefinedProperty>
          <Reference>
              <ID schemeAgencyID="005">HEAD_TYPE</ID>
              <VersionID>1</VersionID>
              <DefinitionClassReference>
                  <ID>SCREW_PROPERTIES</ID>
                  <VersionID>1</VersionID>
              </DefinitionClassReference>
          </Reference>
<SubHierarchyDefinitionIndicator>true
</SubHierarchyDefinitionIndicator>
      </DefinedProperty>
</PropertyDefinitionClass>.
```

The structure of GDT PropertyDefinitionClass 20400 is depicted in FIG. 204. The GDT PropertyDefinitionClass 20400 includes attributes ActionCode 20402 and elements ID 20410, VersionID 20418, RevisionID 20427, CreationDateTime 20436, VersionDateTime 20444, RevisionDateTime 20452, PreferredName 20460, SynonymousName 20469, ShortName 20478, IconAttachement 20487, DefiningDescription 20496, SourceDocumentWebAddress 20406*a*, AdditionalDescription 20415*a*, UsageDescription 20424*a*, TypeCode 20433*a*, SimplifiedGraphicAttachement 20441*a*, SubjectAreaCode 20450*a*, ParentPropertyDefinitionClassReference 20459*a*, Defined Property 20468*a*, and HierarchyPropertyValuation 20407*b*. For the GDT PropertyDefinitionClass 20400, the Representation/Association term is Details 20401.

The ActionCode 20402 is an instruction to the recipient of a message telling it how to process a transmitted business object. For the ActionCode 20402, the Category is Attribute 20403, the Object Class is Property Definition Class 20404, the Property is Action 20405, the Representation/Association term is Code 20406, the Type term is GDT 20407, and the Type Name term is ActionCode 20408. The Cardinality between the GDT PropertyDefinitionClass 20400 and the ActionCode 20402 is zero or one 20409.

The ID 20410 is an unique identifier of the definition class (see GDT PropertyDefinitionClassID). For the ID 20410, the Category is Element 20411, the Object Class is Property Definition Class 20412, the Property is Identification 20413, the Representation/Association term is PropertyDefinitionClassID 20414, the Type term is GDT 20415, and the Type Name term is PropertyDefinitionClassID 20416. The Cardinality between the GDT PropertyDefinitionClass 20400 and the ID 20410 is zero or one 20417.

The VersionID 20418 is an unique identifier for a version of the definition class. For the VersionID 20418, the Category is Element 20419, the Object Class is Property Definition Class 20420, the Property is Version Identification 20421, the Representation/Association term is VersionID 20422, the Type term is GDT 20423, and the Type Name term is VersionID 20424. The Cardinality between the GDT PropertyDefinitionClass 20400 and the VersionID 20418 is zero or one 20425.

The RevisionID 20426 is an unique identifier for a revision of the definition class. The RevisionID is a sequential number that is assigned when changes are made. For the RevisionID 20426, the Category is Element 20427, the Object Class is Property Definition Class 20428, the Property is Revision Identification 20429, the Representation/Association term is Identifier 20430, the Type term is CCT 20431, the Type Name term is Identifier 20432, and the Length is from one to ten 20433. The Cardinality between the GDT PropertyDefinitionClass 20400 and the RevisionID 20426 is zero or one 20434. The RevisionED 20426 may be restricted.

The CreationDateTime 20436 is a creation date/time of the definition class. For the CreationDateTime 20436, the Category is Element 20437, the Object Class is Property Definition Class 20438, the Property is Creation Date Time 20439, the Representation/Association term is DateTime 20440, the Type term is GDT 20441, and the Type Name term is DateTime 20442. The Cardinality between the GDT PropertyDefinitionClass 20400 and the CreationDateTime 20436 is zero or one 20443.

The VersionDateTime 20444 is a creation date/time of the definition class version. For the VersionDateTime 20444, the Category is Element 20445, the Object Class is Property Definition Class 20446, the Property is Version Date Time 20447, the Representation/Association term is DateTime 20448, the Type term is GDT 20449, and the Type Name term is DateTime 20450. The Cardinality between the GDT PropertyDefinitionClass 20400 and the VersionDateTime 20444 is zero or one 20451.

The RevisionDateTime 20452 is a date/time of the last change to the definition class that resulted in a RevisionID. For the RevisionDateTime 20452, the Category is Element 20453, the Object Class is Property Definition Class 20454, the Property is Revision Date Time 20455, the Representation/Association term is DateTime 20456, the Type term is GDT 20457, and the Type Name term is DateTime 20458. The Cardinality between the GDT PropertyDefinitionClass 20400 and the RevisionDateTime 20452 is zero or one 20459.

The PreferredName 20460 is a name of the definition class with, for example, maximum one entry per language. For the PreferredName 20460, the Category is Element 20461, the Object Class is Property Definition Class 20462, the Property Quality term is Preferred 20463, the Property is Name 20464, the Representation/Association term is Name 20465, the Type term is GDT 20466, and the Type Name term is Name 20467. The Cardinality between the GDT PropertyDefinitionClass 20400 and the PreferredName 20460 is one or n 20468.

The SynonymousName 20469 is a synonym for the definition class. Several synonyms can be specified for each language. For the SynonymousName 20469, the Category is Element 20470, the Object Class is Property Definition Class 20471, the Property Quality term is Synonymous 20472, the Property is Name 20473, the Representation/Association term is Name 20474, the Type term is GDT 20475, the Type Name term is Name 20476. The Cardinality between the GDT PropertyDefinitionClass 20400 and the SynonymousName 20469 is from zero to n 20477.

The ShortName 20478 is a short name for definition class. A short name can be entered for each language. For the ShortName 20478, the Category is Element 20479, the Object Class is Property Definition Class 20480, the Property Quality term is Short 20481, the Property is Name 20482, the Representation/Association term is Name 20483, the Type term is GDT 20484, and the Type Name term is Name 20485. The Cardinality between the GDT PropertyDefinitionClass 20400 and the ShortName 20478 is from zero to n 20486.

The IconAttachment 20487 is a preferred symbol or character (alphanumeric character, symbol, or combination thereof) for the definition class that represents the definition class in conformance with international standards, particularly as "symbols" in formulas. For the IconAttachement 20487, the Category is Element 20488, the Object Class is Property Definition Class 20489, the Property Quality term is Icon 20490, the Property is Attachement 20491, the Representation/Association term is Attachement 20492, the Type term is GDT 20493, and the Type Name term is Attachement 20494. The Cardinality between the GDT PropertyDefinitionClass 20400 and the IconAttachement 20487 is zero or one 20495.

The DefiningDescription 20496 is an unique definition of the definition class's meaning makes it possible to uniquely distinguish the definition class from other definition classes. A definition can be entered for each language. For the DefiningDescription 20496, the Category is Element 20497, the Object Class is Property Definition Class 20498, the Property Quality term is Defining 20499, the Property is Description 20401 a, the Representation/Association term is Description 20402*a*, the Type term is GDT 20403*a*, and the Type Name term is Description 20404*a*. The Cardinality between the GDT PropertyDefinitionClass 20400 and the DefiningDescription 20496 is from zero to n 20405*a*.

The SourceDocumentWebAddress 20406*a* is an address of a document available on the Internet in which the definition of the definition class or its meaning can be found. For example, the URI schemes "http" and "https" may be permitted. For the SourceDocumentWebAddress 20406*a*, the Category is Element 20407*a*, the Object Class is Property Definition Class 20408*a*, the Property Quality term is Source 20409*a*, the Property is Document 20410*a*, the Representation/Association term is WebAddress 20411*a*, the Type is CCT 20412*a*, and the Type Name term is WebAddress 20413*a*. The Cardinality between the GDT PropertyDefinitionClass 20400 and the SourceDocumentWebAddress 20406*a* is zero or one 20414*a*.

The AdditionalDescription 20415*a* is an additional information about parts of the definition class; aids the understanding of the definition class. The description can extend the definition. For the AdditionalDescription 20415*a*, the Category is Element 20416*a*, the Object Class is Property Definition Class 20417*a*, the Property Quality term is Additional 20418*a*, the Property is Description 20419*a*, the Representation/Association term is Description 20420*a*, the Type term is GDT 20421*a*, and the Type Name term is Description 20422*a*. The Cardinality between the GDT PropertyDefinitionClass 20400 and the AdditionalDescription 20415*a* is from zero to n 20423*a*.

The UsageDescription 20424*a* is a description of special aspects concerning the usage of the property. This can be explanatory text of general/individual notes. For the UsageDescription 20424*a*, the Category is Element 20425*a*, the Object Class is Property Definition Class 20426*a*, the Property Quality term is Usage 20427*a*, the Property is Description 20428*a*, the Representation/Association term is Description 20429*a*, the Type term is GDT 20430*a*, and the Type Name term is Description 20431*a*. The Cardinality between the GDT PropertyDefinitionClass 20400 and the UsageDescription 20424*a* is from zero to n 20432*a*.

A TypeCode 20433*a* is similar in its general description to GDT PropertyDefinitionClassTypeCode. For the TypeCode 20433*a*, the Category is Element 20434*a*, the Object Class is Property Definition Class 20435*a*, the Property is Type 20436*a*, the Representation/Association term is Code 20437*a*, the Type term is GDT 20438*a*, and the Type Name term is PropertyDefinitionClassTypeCode 20439*a*. The Cardinality between the GDT PropertyDefinitionClass 20400 and the TypeCode 20433*a* is zero or one 20440*a*.

The SimplifiedGraphicAttachment 20441*a* is a reference to a graphic that illustrates the meaning of the definition class. For the SimplifiedGraphicAttachement 20441*a*, the Category is Element 20442*a*, the Object Class is Property Definition Class 20443*a*, the Property Quality term is Simplified Graphic 20444*a*, the Property is Attachement 20445*a*, the Representation/Association term is Attachement 20446*a*, the Type term is GDT 20447*a*, and the Type Name term is Attachement 20448*a*. The Cardinality between the GDT PropertyDefinitionClass 20400 and the SimplifiedGraphicAttachement 20441*a* is zero or one 20449*a*.

The SubjectAreaCode 20450*a* is a subject area in accordance with the International Classification of Standards (see GDT SubjectAreaCode). For the SubjectAreaCode 20450*a*, the Category is Element 20451*a*, the Object Class is Property Definition Class 20452*a*, the Property Quality term is Topic 20453*a*, the Property is SubjectArea 20454*a*, the Representation/Association term is Code 20455*a*, the Type term is GDT 20456*a*, and the Type Name term is SubjectAreaCode 20457*a*. The Cardinality between the GDT PropertyDefinitionClass 20400 and the SubjectAreaCode 20450*a* is from zero to n 20458*a*.

The ParentPropertyDefinitionClassReference 20459*a* is an assignment to the parent property definition class. In the case of versioning, the version of this definition class is specified in the reference. For the ParentPropertyDefinitionClassReference 20459*a*, the Category is Element 20460*a*, the Object Class is Property Definition Class 20461*a*, the Property Quality term is Parent 20462*a*, the Property is Definition Class Reference 20463*a*, the Representation/Association term is PropertyDefinitionClassReference 20464*a*, the Type term is GDT 20465*a*, and the Type Name term is PropertyDefinitionClassReference 20466*a*. The Cardinality between the GDT PropertyDefinitionClass 20400 and the ParentPropertyDefinitionClassReference 20459*a* is zero or one 20467*a*.

The DefinedProperty 20468*a* is the property defined in this definition class. For the DefinedProperty 20468*a*, the Category is Element 20469*a*, the Object Class is Property Definition Class 20470*a*, the Property is Defined Property 20471*a*, and the Representation/Association term is Details 20472*a*. The Cardinality between the GDT PropertyDefinitionClass 20400 and the DefinedProperty 20468*a* is from zero to n 20473*a*.

The Reference 20474*a* is an assignment to the parent property definition class. In versioning, the version of this definition class is indicated in the reference. For the Reference 20474*a*, the Category is Element 20475*a*, the Object Class is Defined Property 20476*a*, the Property is Reference 20477*a*, the Representation/Association term is PropertyReference 20478*a*, the Type term is GDT 20479*a*, and the Type Name term is PropertyReference 20480*a*. The Cardinality between the GDT PropertyDefinitionClass 20400 and the DefinedProperty 20468*a* Reference 20474*a* is one or one 20481*a*.

The OrdinalNumberValue 20482*a* is the position of a property in the property list of a definition class. The sequence of the property list is given by the desired display sequence of the properties. For the Ordinal Number Value 20482*a*, the Category is Element 20475*a*, the Object Class is Defined Property 20476*a*, the Property is Ordinal Number 20485*a*, the Representation/Association term is Value 20486*a*, the Type term is GDT 20487*a*, and the Type Name term is OrdinalNumberValue 20488*a*. The Cardinality between the GDT PropertyDefinitionClass 20400 and the DefinedProperty 20468*a* Ordinal Number Value 20482 is zero or one 20489*a*.

The SubHierarchyDefinitionIndicator 20490*a* indicates whether or not the property creates hierarchies for the subordinate hierarchy level (see "Constraints"). For the SubHierarchy DefinitionIndicator 20490*a*, the Category is Element 20491*a*, the Object Class is Defined Property 20492*a*, the Property is SubHierarchy 20493*a*, the Representation/Association term is Definition 20494*a*, the Type term is CCT 20495*a*, and the Type Name term is Indicator 20496*a*. The Cardinality between the GDT PropertyDefinitionClass 20400 and the DefinedProperty 20468*a* SubHierarchy DefinitionIndicator 20490*a* is zero or one 20497*a*.

The VisibilityIndicator 20498*a* indicates whether the property can be used at the current hierarchy level or not. For the VisibilityIndicator 20498*a*, the Category is Element 20499*a*, the Object Class is Defined Property 20401*b*, the Property is Visibility 20402*b*, the Representation/Association term is Indicator 20403*b*, the Type term is CCT 20404*b*, and the Type Name term is Indicator 20405*b*. The Cardinality between the GDT PropertyDefinitionClass 20400 and the DefinedProperty 20468*a* VisibilityIndicator 20498*a* is zero or one 20406*b*.

The HierarchyPropertyValuation 20407*b* is the value restriction for the properties indicated in the parent definition class as able to create hierarchies (see Integrity Conditions). For the HierarchyPropertyValuation 20407*b*, the Category is Element 20408*b*, the Object Class is Property Definition Class 20409*b*, the Property Quality term is Hierarchy 20410*b*, the Property is Property Valuation 20411*b*, the Representation/Association term is PropertyValuation 20412*b*, the Type term is GDT 20413*b*, and the Type Name term is PropertyValuation 20414*b*. The Cardinality between the GDT PropertyDefinitionClass 20400 and the HierarchyPropertyValuation 20407*b* is from zero to n 20415*b*.

See ISO13584/42 (Definition of data model for properties), available from the GDT owner, for illustrative Integrity Conditions.

In particular with regard to the hierarchy, Integrity Conditions may be observed in accordance with ISO13584/42. This form of hierarchy creation may be used to formalize the creation rules and to store these rules in the form of properties and their values. This prevents information from becoming lost and enables the hierarchies to be created both explicitly and transparently. The hierarchy may be strict (i.e., one predecessor) and without cycles.

If a definition class is to contain subordinate definition classes, at least one of the properties contained in the class may be indicated as able to create hierarchies. The data types for these properties may contain value ranges. Value ranges may be specified for all the properties that have been indicated in the parent definition class as able to create hierarchies. Value ranges of subordinate definition classes that are created in this way for such a property may represent a decomposition of the value range for the data type of the property that creates hierarchies.

Properties can be created for a definition class, but should first be available at lower hierarchy levels. In this case, the VisibilityIndicator is set just at the desired hierarchy level. Once the indicator has been set once for a given property, it cannot be reset at lower hierarchy levels.

The ID of the definition class may be identical to the definition class ID of the properties contained in the class—this involves two different views for the same subject.

The definition class is used to group together related business properties. Since the definition class belongs to the property key, the definition class ‘AUTOLACKE’ (car paint) and the definition class ‘TEXTILFARBE’ (textile colors) can contain, e.g., the ‘FARBE’ (color) property, this then involves two different properties that can have different attributes.

The definition class is also used as a technical aid to group together properties implicitly by business topic; e.g., the properties of a Knowledge Base in the Internet Pricing Configurator can each be mapped to one definition class. This prevents conflicts between data with the same name but from different Knowledge Bases. Another example of this would be different instances of an SAP catalog that group together different properties with the same name in different definition classes. The definition class is the starting point for distributing properties. The properties of given definition class are distributed.

In contrast to ISO13584/42 and the Classification Management Engine, the definition class is optional in the GDTs for properties. This enables the GDTs to also be used in simple scenarios and to connect external users who are new to this data model. Some elements that are mandatory in ISO13584/42 are optional in this scheme. This is intended to enable wider use of the schema. In an embodiment, the definition class does not correspond to the R/3 class in R/3 classification (see Comment). The R/3 class can also group together the properties of a subject area. However, a property may be used in different classes. In that case, a property is defined in one definition class. This means that properties cannot be mapped between the concepts.

(nnnnnnn) PropertyDefinitionClassID

A GDT PropertyDefinitionClassID 20500 is a unique identifier for a property definition class. A GDT PropertyDefinitionClass 20500 is a class for defining properties (in a classification system). A PropertyDefinitionClass defines a subject area. The properties defined in a PropertyDefinitionClass represent the attributes of this subject area. An example or instance is:

<PropertyDefinitionClassID schemeAgencyID=“005”>MY_DEF_CLASS__01</PropertyDefinitionClassID>(005=ISO).

The structure of GDT PropertyDefinitionClassID 20500 is depicted in FIG. 205. The GDT PropertyDefinitionClassID 20500 includes attributes schemeAgencyID 20516, schemeAgencySchemeID 20532, and schemeAgencySchemeAgencyID 20550. For the GDT PropertyDefinitionClassID 20500, the Object Class is Property Definition Class 20502, the Property is Identification 20504, the Representation/Association term is Identifier 20506, the Type term is CCT 20508, the Type Name term is Identifier 20510, and the Length is from one to fifty 20512. The GDT PropertyDefinitionClassID 20500 may be a restricted GDT.

For the schemeAgencyID 20516, the Category is Attribute 20518, the Object Class is IdentificationSchemeAgency 20520, the Property is Identification 20522, the Representation/Association term is Identifier 20524, the Type term is xsd 20526, the Type Name term is Token 20528, and the Length is from one to sixty 20530. The Cardinality between the GDT PropertyDefinitionClassID 20500 and the schemeAgencyID 20516 is one 20531.

For the schemeAgencySchemeID 20532, the Category is Attribute 20534, the Object Class is IdentificationSchemeAgency 20536, the Property is Scheme 20538, the Representation/Association term is Identifier 20540, the Type term is xsd 20542, the Type Name term is Token 20544, and the Length is from one to sixty 20546. The Cardinality between the GDT PropertyDefinitionClassID 20500 and the schemeAgencySchemeID 20532 is zero or one 20548.

For the schemeAgencySchemeAgencyID 20550, the Category is Attribute 20552, the Object Class is IdentificationSchemeAgency 20554, the Property is SchemeAgency 20556, the Representation/Association term is Identifier 20558, the Type term is xsd 20560, the Type Name term is Token 20562, and the Length is three 20564. The Cardinality between the GDT PropertyDefinitionClassID 20500 and the schemeAgencySchemeAgencyID 20550 is zero or one 20566.

If there are several schemes for an Agency (e.g., the organization “ISO,” “DIN,” or “Siemens”), the GDT may be extended to include the schemeID attribute. The concept is defined, for example, in ISO13584/42. The GDT PropertyDefinitionClassReference is used to reference a version of a property definition class.

(ooooooo) PropertyDefinitionClassReference

A GDT PropertyDefinitionClassReference 20600 is a unique reference to a property definition class or to a version of a property definition class. A GDT PropertyDefinitionClass 20600 is a class for defining properties (in a classification system). A GDT PropertyDefinitionClass 20600 establishes a subject area. The properties defined in a GDT PropertyDefinitionClass 20600 map the attributes of this subject area. An example or instance is:

```
<PropertyDefinitionClassReference>
  <ID schemeAgencyID="005">SCREW_PROPERTIES</ID>
  <VersionID>1</VersionID>
</PropertyDefinitionClassReference>
(005=ISO).
```

The structure of GDT PropertyDefinitionClassReference 20600 is depicted in FIG. 206. The GDT PropertyDefinitionClassReference 20600 includes elements ID and VersionID. For GDT PropertyDefinitionClassReference 20600, the Object Class is Property Definition Class Reference 20602 and the Representation/Association term is Details 20604.

The ID 20606 is the identifier for the property definition class. For the ID 20606, the Category is Element 20606, the Object Class is Property Definition Class Reference 20610, the Property is Identification 20612, the Representation/Association term is Identifier 20614, the Type term is GDT 20616, and the Type Name term is PropertyDefinitionClassID 20618. The Cardinality between the GDT PropertyDefinitionClassReference 20600 and the ID 20606 is one 20620.

The VersionID 20622 is the version for the property definition class. For the VersionID 20622, the Category is Element 20624, the Object Class is Property Definition Class Reference 20626, the Property is Version Identification 20628, the Representation/Association term is Identifier 20630, the Type term is GDT 20632, and the Type Name term is VersionID 20634. The Cardinality between the GDT PropertyDefinitionClassReference 20600 and the VersionID 20622 is zero or one 20636.

For information about the property definition class, see the GDT PropertyDefinitionClass.

(ppppppp) PropertyDefinitionClassTypeCode

The DefinitionClassTypeCode 20700 is a coded representation of the nature of a definition class. This may be determined based on its business purpose, from which the attributes may be derived. An example or instance is: <DefinitionClassTypeCode>M</DefinitionClassTypeCode>.

The structure of GDT DefinitionClassTypeCode 20700 is depicted in FIG. 207. For the GDT DefinitionClassTypeCode 20700, the Object Class is Definition Class Type 20702, the Representation/Association term is Code 20704, the Type term is CCT 20706, the Type Name term is Code 20708, and the Length is one 20710. The GDT DefinitionClassTypeCode 20700 may be a restricted GDT.

In an embodiment, the illustrative Codes in accordance with ISO13584/42 that are permitted are as follows:

The Code I has the Name Item class. A definition class of this type can contain properties of all the specializations described below.

The Code C has the Name Component class, which is an 'Item class' specialization; the properties that are contained in this type of definition class are used to describe assemblies based on their assignment relationships.

The Code M has the Name Material class, which is an 'Item class' specialization; the properties that are contained in this type of definition class are used to describe basic materials, materials, and the like, based on their physical attributes.

The Code F has the Name Feature class, which is an 'Item class' specialization; the properties that are contained in this type of definition class are used to describe objects based on their geometry, form, and function.

(qqqqqqq) PropertyID

A GDT PropertyID 20800 is a unique identifier for a property. A property is an object attribute. An example is: <PropertyID schemeAgencyID="005">LENGTH</PropertyID>rue, (005=ISO).

The structure of GDT PropertyID 20800 is depicted in FIG. 208. The GDT PropertyID 20800 includes attributes schemeAgencyID 20816, schemeAgencySchemeID 20834, and schemeAgencySchemeAgencyID 20852. For the GDT PropertyID 20800, the Object Class is Property 20802, the Property is Identification 20804, the Representation/Association term is Identifier 20806, the Type term is CCT 20808, the Type Name term is Identifier 20810, and the Length is from one to fifty 20812. The GDT PropertyID 20800 may be a restricted GDT.

For schemeAgencyID 20816, the Category is Attribute 20818, the Object Class is Identification Scheme-Agency 20820, the Property is Identification 20822, the Representation/Association term is Identifier 20824, the Type term is xsd 20826, the Type Name term is Token 20828, and the Length is from one to sixty 20830. The Cardinality between the GDT PropertyID 20800 and the schemeAgencyID 20816 is one or one 20832.

For the schemeAgencySchemeID 20834, the Category is Attribute 20836, the Object Class is Identification Scheme-Agency 20838, the Property is Scheme 20840, the Representation/Association term is Identifier 20842, the Type term is xsd 20844, the Type Name term is Token 20846, and the Length is from one to sixty 20848. The Cardinality between the GDT PropertyID 20800 and the schemeAgencySchemeID 20834 is zero or one 20850.

For the schemeAgencySchemeAgencyID 20852, the Category is Attribute 20854, the Object Class is Identification Scheme-Agency 20856, the Property is SchemeAgency 20858, the Representation/Association term is Identifier 20860, the Type term is xsd 20862, the Type Name term is Token 20864, and the Length is three 20866. The Cardinality between the GDT PropertyID 20800 and the schemeAgencySchemeAgencyID 20852 is zero or one 20868.

If a definition class is used, the schemeAgency may be identical to the schemeAgency of the identifier for the property definition class in which the property was defined (see GDT PropertyDefinitionClassID).

The concept is defined in ISO13584/42. Related GDTs to 20800 are Property, PropertyDataTypeIdentification, PropertyDataType, DefinitionClassIdentification, DefinitionClass, PropertyValues, and PropertyValuation. The object corresponds to the BOR object BUS1088 (characteristic) and to the Characteristic Management Engine property (CME property) from the new classification.

(rrrrrrr)PropertyMultipleValueIndicator

A GDT PropertyMultipleValueIndicator 20900 indicates whether or not a property can incorporate a list of values. An example is: <PropertyMultipleValueIndicator>true</PropertyMultipleValueIndicator>.

The structure of GDT PropertyMultipleValueIndicator 20900 is depicted in FIG. 209. For the GDT PropertyMultipleValueIndicator 20900, the Object Class is Property 20902, the Property is Multiple Value 20904, the Representation/Association term is Indicator 20906, and the Type term is Indicator 20908.

Valid illustrative values for 20900 are:

1) true, meaning several values can be assigned to the property; and
2) false, meaning one value can be assigned to the property. (For the value range, see CCT:Indicator)

(sssssss) PropertyParametricSearchableIndicator

A GDT PropertyParametricSearchableIndicator 21000 indicates whether a property is suitable for a parametric search or not. A parametric search (also called an 'attribute search') is a search for an object using explicit information about which values a property in the object is to contain. For example, in the case of a parametric search for a red vehicle with 100 HP, the illustrative properties are:

1) a Color equal to "red;" and
2) a Performance equal to "100 HP," which are specified explicitly.

An example is: <PropertyParametricSearchableIndicator>true</PropertyParametricSearchableIndicator>.

The structure of GDT PropertyParametricSearchableIndicator 21000 is depicted in FIG. 210. For the GDT PropertyParametricSearchableIndicator 21000, the Object Class is Property 21002, the Property is Parametric Searchable 21004, the Representation/Association term is Indicator 21006, the Type term is CCT 21008, and the Type Name term is Indicator 21010.

Valid illustrative values for 21000 are:

1) true, meaning the property is suitable for a parametric search; and
2) false, meaning the property is not suitable for a parametric search. The GDT PropertyParametricSearchableIndicator 21000 is used in the context of the property definition.

(ttttttt) PropertyReference

A GDT PropertyReference 21100 is a unique reference to a property or a version of a property. The referenced property can have been defined in a property definition class. An example is:

```
<PropertyReference>
  <ID schemeAgencyID="005">LENGTH</ID>
  <VersionID>1</VersionID>
  <DefinitionClassReference>
    <ID schemeAgencyID="005">SCREW_PROPERTIES</ID>
  </DefinitionClassReference>
</PropertyReference>
(005 = ISO).
```

The structure of GDT PropertyReference 21100 is depicted in FIG. 211. The GDT PropertyReference 21100 includes elements ID 21106, VersionID 21122, and DefinitionClassReference 21138. For the GDT PropertyReference 21100, the Object Class is Property Reference 21102 and the Representation/Association term is Details 21104.

The ID 21106 is the identifier for the property. For the ID 21106, the Category is Element 21108, the Object Class is PropertyReference 21110, the Property is Identification 21112, the Representation/Association term is Identifier 21114, the Type term is GDT 21116, and the Type Name is PropertyID 21118. The Cardinality between the GDT PropertyReference 21100 and the ID 21106 is one or one 21120.

The VersionID 21122 is the version of the property. For the VersionID 21122, the Category is Element 21124, the Object Class is PropertyReference 21126, the Property is Version Identification 21128, the Representation/Association term is VersionID 21130, the Type term is GDT 21132, and the Type Name term is VersionID 21134. The Cardinality between the GDT PropertyReference 21100 and the VersionID 21122 is zero or one 21136.

The DefinitionClassReference 21138 is the reference to the definition class (or to a version of the definition class) of the property. If a reference exists, the property is unique within the specified definition class. For the DefinitionClassReference 21138, the Category is Element 21140, the Object Class is PropertyReference 21142, the Property is Definition Class Reference 21144, the Representation/Association term is DefinitionClassReference 21146, the Type term is GDT 21148, and the Type Name term is DefinitionClassReference 21150. The Cardinality between the GDT PropertyReference 21100 and the DefinitionClassReference 21138 is zero or one 21152.

If a definition class is used, the property issuer may be identical to the issuer of the property definition class. The conceptual context of the PropertyReference is defined in ISO13584/42. Related GDTs for 21100 are: Property, PropertyDataTypeIdentification, PropertyDataType, PropertyDefinitionClass, PropertyDefinitionClassID, PropertyValues, and PropertyValuation.

PropertyReference corresponds to the BOR object BUS1088 "Characteristic" and to the CME property from the new classification.

(uuuuuuu) PropertyValuation

The GDT PropertyValuation 21200 is the assignment of values to a property. A property valuation is performed for an object as part of the classification procedure in order to describe its attributes. An example or instance is:

Valuation of a property with a simple data type:

```
<PropertyValuation>
    <PropertyReference>
        <ID>LENGTH</ID>
        <DefinitionClassReference>
            <ID>SCREW_PROPERTIES</ID>
            <Version>1</Version>
        <DefinitionClassReference>
    <PropertyReference>
    <PropertyValue>
        <MeasureSpecification>
            <Measure unitCode="12">3</Measure>
        </MeasureSpecification>
    <PropertyValue>
</PropertyValuation>
```

unitCode="12" corresponds to centimeters in accordance with UM/CEFACT Rec. #20 (Units of Measure)

Valuation of a property with a complex data type:

The 'VERBRAUCHSPROFIL' (consumption profile) property consists of the 'STRASSENTYP' (street type) and 'VERBRAUCH' (consumption) properties. The data type of the 'VERBRAUCHSPROFIL' property has a complex format and references the 'AUTOS' (cars) definition class that contains the component properties.

```
Complex (grouping) property 'VERRAUCHSPROFIL':
    <PropertyValuation>
        <ID>1</ID>
        <PropertyReference>
            <ID>VERBRAUCHSPROFIL</ID>
            <DefinitionClassReference>
                <ID>AUTOS</ID>
            </DefinitionClassReference>
        </PropertyReference>
    </PropertyValuation>
Property 'STRASSENTYP':
    <PropertyValuation>
        <ID>2</ID>
        <ParentID>1</ParentID>
        <PropertyReference>
            <ID>STRASSENTYP</ID>
            <DefinitionClassReference>
                <ID>VERBRAUCHSTYP</ID>
            </DefinitionClassReference>
        </PropertyReference>
        <PropertyValue>
            <NameSpecification>
                <Name>LANDSTRASSE</Name>
            </NameSpecification>
        </PropertyValue>
    </PropertyValuation>
Property 'VERBRAUCH':
    <PropertyValuation>
        <ID>3</ID>
        <ParentID>1</ParentID>
        <PropertyReference>
            <ID>VERBRAUCH</ID>
            <DefinitionClassReference>
                <ID>VERBRAUCHSTYP</ID>
            </DefinitionClassReference>
        </PropertyReference>
        <PropertyValue>
            <MeasureSpecification>
                <Measure unitCode"49">5</Measure>
            </MeasureSpecification>
        </PropertyValue>
    </PropertyValuation>
```

unitCode="49" corresponds to liters in accordance with UN/CEFACT REC. #20 (Units of Measure)

The structure of GDT Property Valuation 21200 is depicted in FIG. 212. The GDT Property Valuation 21200 includes attribute ActionCode 21206 and elements ID 21222, ParentID 21240, PropertyReference 21258, and PropertyValue 21274. For the GDT Property Valuation 21200, the Object Class is Property Valuation 21202*a* and the Representation/Association term is Details 21204.

The ActionCode 21206 is an instruction to the recipient of a message about how to process a transmitted property. For the ActionCode 21206, the Category is Attribute 21208, the Object Class is Property Valuation 21210, the Property is Action 21212, the Representation/Association term is Code 21214, the Type term is GDT 21216, and the Type Name term is ActionCode 21218. The Cardinality between the GDT Property Valuation 21200 and the ActionCode 21206 is zero or one 21220.

The ID 21222 is an unique identifier of the property valuation. The attribute may be used for valuating properties with a complex data type. ID is unique in the context of the valuated object. For the ID 21222, the Category is Element 21224, the Object Class is Property Valuation 21226, the Property is Identification 21228, the Representation/Association term is Identifier 21230, the Type term is CCT 21232, the Type Name term is Identifier 21234, and the Length is from one to ten 21236. The Cardinality between the GDT Property Valuation 21200 and the ID 21222 is zero or one 21238.

The ParentID 21240 is an identifier for the property valuation (for the valuation of a complex data type) that is a parent to the current property valuation. For the ParentID 21240, the Category is Element 21242, the Object Class is Property Valuation 21244, the Property is Parent Identification 21246, the Representation/Association term is Identifier 21248, the Type term is CCT 21250, the Type Name term is Identifier 21252, and the Length is from one to ten 21254. The Cardinality between the GDT Property Valuation 21200 and the ParentID 21240 is zero or one 21256.

The PropertyReference 21258 is a reference to the underlying property for which the property valuation is mapped. For the PropertyReference 21258, the Category is Element 21260, the Object Class is Property Valuation 21262, the Property is Property Reference 21264, the Representation/Association term is Reference 21266, the Type term is GDT 21268, and the Type Name term is PropertyReference 21270. The Cardinality between the GDT Property Valuation 21200 and the PropertyReference 21258 is one 21272.

The PropertyValue 21274 is a value of the above property. For the PropertyValue 21274, the Category is Element 21276, the Object Class is Property Valuation 21278, the Property is Property Value 21280, the Representation/Association term is Property Value 21282, the Type term is GDT 21284, and the Type Name term is PropertyValue 21286. The Cardinality between the GDT Property Valuation 21200 and the PropertyValue 21274 is from zero to n 21288.

See ISO13584/42 (Definition of data model for properties) available from the GDT owner, for illustrative integrity conditions for 21200. The valuations may correspond to the formats specified by the data type (see GDT: PropertyDataType) of the valuated property (see GDT: Property). If the data type contains a value list, valuations may be included in this value list. The number of property values in the valuation may generally correspond to the value assignment type (any, as required) defined in the property. These integrity conditions apply in the case of a final actual valuation and not in the case of specifications for a final valuation. In this case, the valuation restricts the permitted value range of the property. An example of this is the valuation of a batch material that merely specifies the valuation range for the actual batches. Several valuations can also be specified for single-value properties. In an embodiment, a property with a complex data type may not be valuated directly. However, the components of its data type can be. In this case, PropertyValue 21274 is empty. PropertyValue 21274 is filled for the relevant components and the ParentID 21240 contains the ID 21222 of the parent property with the complex data type.

PropertyValuation is used by classified objects such as, e.g., batch: a property valuation consists of the key of the property to be valuated and the associated values. Thus, e.g., if the 'color' (property) of a batch is 'red' (value) or its 'weight' (property) is '5 kg' (value,) the combination of property and value constitutes the property valuation. PropertyValuation is also used for a formal description of the creation of definition class hierarchies (See GDT PropertyDefinitionClass).

(vvvvvvv) PropertyValuationRequiredIndicator

A GDT PropertyValuationRequiredIndicator 21300 indicates whether or not a value has to be specified for a property. An example is: <PropertyValuationRequiredIndicator>true</PropertyValuationRequiredIndicator>.

The structure of GDT PropertyValuationRequiredIndicator 21300 is depicted in FIG. 213. For the GDT PropertyValuationRequiredIndicator 21300, the Object Class is Property 21302, the Property is Valuation Required 21304, the Representation/Association term is Indicator 21306, the Type term is CCT 21308, and the Type Name term is Indicator 21310.

Valid illustrative values for 21300 are 1) true, meaning that a value may be specified; or 2) false, meaning that a value does not have to be specified. For the value range, see CCT: Indicator.

(wwwwwww) PropertyValue

A GDT PropertyValue 21400 describes a value that can be assigned to a property. The value can also be an interval. An example is:

```
<PropertyValue>
  <IntegerSpecification>
    <Value>1</Value>
  </IntegerSpecification>
  <PreferredName languageCode="DE">Eins</PreferedName>
  <PreferredName languageCode="EN">one</PreferedName>
</PropertyValue>.
```

The structure GDT Property Value 21400 is depicted in FIG. 214. The GDT Property Value 21400 includes elements AmountSpecification21404, QuantitySpecification 21436, DecimalSpecification 21468, FloatSpecification 21404*a*, IntegerSpecification 21439*a*, DateSpecification 21474*a*, TimeSpecification 21404*b*, DateTimeSpecification 21433*b*, NameSpecification 21462*b*, IndicatorSpecification 21476*b*, and IntervalTypeCode 21490*b*. For the GDT Property Value 21400, the Category is Element 21401, the Object Class is Property Value 21402, and the Representation/Association term is Details 21403.

The AmountSpecification 21404 contains the specification of currency-based values (amounts). For the AmountSpecification 21404, the Category is Element 21405, the Object Class is Property Value 21406, the Property is Amount Specification 21407, and the Representation/Association term is Details 21408. The Cardinality between the GDT Property Value 21400 and the AmountSpecification 21404 is zero or one 21409.

The Amount 21410 is a discrete, currency-based single value or amount. The Amount 21410 is of type GDT: Amount. For the Amount 21410, the Category is Element 21411, the Object Class is Amount Specification 21412, the Property is Amount 21413, the Representation/Association term is Amount 21414, the Type term is GDT 21415, and the Type Name term is Amount 21416. The Cardinality between the GDT Property Value 21400 and the AmountSpecification 21404 Amount 21410 is between zero or one 21417.

The LowerAmount 21418 is a lower limit in a currency-based value interval. The LowerAmount 21418 is of type GDT: Amount. For the LowerAmount 21418, the Category is Element 21419, the Object Class is Amount Specification 21420, the Property Quality term is Lower 21421, the Property is Amount 21422, the Representation/Association term is Amount 21423, the Type term is GDT 21424, and the Type Name term is Amount 21425. The Cardinality between the GDT Property Value 21400 and the AmountSpecification 21404 LowerAmount 21418 is zero or one 21426.

The UpperAmount 21427 is an upper limit in a currency-based value interval. The UpperAmount is of type GDT: Amount. For the UpperAmount 21427, the Category is Element 21428, the Object Class is amount Specification 21429, the Property Quality term is Upper 21430, the Property is Amount 21431, the Representation/Association term is Amount 21432, the Type term is GDT 21433, and the Type Name term is Amount 21434. The Cardinality between the GDT Property Value 21400 and the AmountSpecification 21404 UpperAmount 21427 is zero or one 21435.

The QuantitySpecification 21436 contains the specification of quantities in a unit of measurement/measure. For the QuantitySpecification 21436, the Category is Element 21437, the Object Class is Property Value 21438, the Property is Quantity Specification 21439, and the Representation/Association term is Details 21440. The Cardinality between the GDT Property Value 21400 and the QuantitySpecification 21436 is zero or one 21441.

The Quantity 21442 is an individual quantity in a unit of measurement. The Quantity 21442 is of type GDT: Quantity. For the Quantity 21442, the Category is Element 21443, the Object Class is Quantity Specification 21444, the Property is Quantity 21445, the Representation/Association term is Quantity 21446, the Type term is GDT 21447, and the Type Name term is Quantity 21448. The Cardinality between the GDT Property Value 21400 and the QuantitySpecification 21436 Quantity 21442 is zero or one 21449.

The LowerQuantity 21450 is a lower limit in a quantity interval. The LowerQuantity 21450 is of type GDT:Quantity. For the LowerQuantity 21450, the Category is Element 21451, the Object Class is Quantity Specification 21452, the Property Quality term is Lower 21453, the Property is Quantity 21454, the Representation/Association term is Quantity 21455, the Type term is GDT 21456, and the Type Name term is Quantity 21457. The Cardinality between the GDT Property Value 21400 and the LowerQuantity 21450 is zero or one 21458.

The UpperQuantity 21459 is an upper limit in a quantity interval. The UpperQuantity 21459 is of type GDT:Quantity. For the UpperQuantity 21459, the Category is Element 21460, the Object Class is Quantity Specification 21461, the Property Quality term is Upper 21462, the Property is Quantity 21463, the Representation/Association term is Quantity 21464, the Type term is GDT 21465, and the Type Name term is Quantity 21466. The Cardinality between the GDT Property Value 21400 and the UpperQuantity 21459 is zero or one 21467.

The DecimalSpecification 21468 contains the specification of decimal numbers. For the DecimalSpecification 21468, the Category is Element 21469, the Object Class is Property Value 21470, the Property is Numeric Specification 21471, and the Representation/Association term is Details 21472. The Cardinality between the GDT Property Value 21400 and the DecimalSpecification 21468 is zero or one 21473.

The DecimalValue 21474 is a discrete decimal value. The DecimalValue 21474 is of type GDT: DecimalValue. For the DecimalValue 21474, the Category is Element 21475, the Object Class is Decimal Specification 21476, the Property is Decimal Value 21477, the Representation/Association Quality term is Decimal 21478, the Representation/Association term is Value 21479, the Type term is GDT 21480, and the Type Name term is DecimalValue 21481. The Cardinality between the GDT Property Value 21400 and the DecimalValue 21474 is zero or one 21482.

The LowerDecimalValue 21483 is a lower limit in a value interval of decimal values. The LowerDecimalValue 21483 is of type GDT: DecimalValue. For the LowerDecimalValue 21483, the Category is Element 21484, the Object Class is Decimal Specification 21485, the Property Quality term is Lower 21486, the Property is Decimal Value 21487, the Representation/Association Quality term is Decimal 21488, the Representation/Association term is Value 21489, the Type term is GDT 21490, and the Type Name term is DecimalValue 21491. The Cardinality between the GDT Property Value 21400 and the LowerDecimalValue 21483 is zero or one 21492.

The UpperDecimalValue 21493 is an upper limit in a value interval of decimal values. The UpperDecimalValue 21493 is of type GDT: DecimalValue. For the UpperDecimalValue 21493, the Category is Element 21494, the Object Class is Decimal Specification 21495, the Property Quality term is Upper 21496, the Property is Decimal Value 21497, the Representation/Association Quality term is Decimal 21498, the Representation/Association term is Value 21499, the Type term is GDT 21401, and the Type Name term is DecimalValue **21402*a*. The Cardinality between the GDT Property Value 21400 and the UpperDecimalValue 21493 is zero or one 21403*a***.

The FloatSpecification **21404*a* contains the specification of the floating point values. For the FloatSpecification 21404*a*, the Category is Element 21405*a*, the Object Class is Property Value 21406*a*, the Property is Float Specification 21407*a*, and the Representation/Association term is Details 21408*a*. The Cardinality between the GDT Property Value 21400 and the FloatSpecification 21404*a* is zero or one 21409*a***.

The FloatValue **21410*a* is a discrete floating point value. The FloatValue is type GDT: FloatValue. For the FloatValue 21410*a*, the Category is Element 21411*a*, the Object Class is Float Specification 21412*a*, the Property is FloatValue 21413*a*, the Representation/Association Quality term is Float 21414*a*, the Representation/Association term is Value 21415*a*, the Type term is GDT 21416*a*, and the Type Name term is FloatValue 21417*a*. The Cardinality between the GDT Property Value 21400 and the FloatValue 21410*a* is zero or one 21418*a***.

The LowerFloatValue **21419*a* is a lower limit in a value interval of floating point values. The LowerFloatValue 21419*a* is of type GDT: FloatValue. For the LowerFloatValue 21419*a*, the Category is Element 21420*a*, the Object Class is Float Specification 21421*a*, the Property Quality term is Lower 21422*a*, the Property is Float Value 21423*a*, the Representation/Association Quality term is Float 21424*a*, the Representation/Association term is Value 21425***a*, the Type term is GDT 21426*a*, and the Type Name term is FloatValue 21427*a*. The Cardinality between the GDT Property Value 21400 and the LowerFloatValue 21419*a* is zero or one 21428*a*.

The UpperFloatValue 21429*a* is an upper limit in a value interval of floating point values. The UpperFloatValue 21429*a* is of type GDT: FloatValue. For the UpperFloatValue 21429*a*, the Category is Element 21430*a*, the Object Class is Float Specification 21431*a*, the Property Quality term is Upper 21432*a*, the Property is Float Value 21433*a*, the Representation/Association Quality term is Float 21434*a*, the Representation/Association term is Value 21435*a*, the Type term is GDT 21436*a*, and the Type Name term is FloatValue 21437*a*. The Cardinality between the GDT Property Value 21400 and the UpperFloatValue 21429*a* is zero or one 21438*a*.

The IntegerSpecification 21439*a* contains the specification of integer values. For the IntegerSpecification 21439*a*, the Category is Element 21440*a*, the Object Class is Property Value 21441*a*, the Property is Integer Specification 21442*a*, and the Representation/Association term is Details 21443*a*. The Cardinality between the GDT Property Value 21400 and the IntegerSpecification 21439*a* is zero or one 21444*a*.

The IntegerValue 21445*a* is a discrete integer value. The IntegerValue 21445*a* is of type GDT: IntegerValue. For the IntegerValue 21445*a*, the Category is Element 21446*a*, the Object Class is Integer Specification 21447*a*, the Property is Integer Value 21448*a*, the Representation/Association Quality term is Integer 21449*a*, the Representation/Association term is Value 21450*a*, the Type term is GDT 21451*a*, and the Type Name term is IntegerValue 21452*a*. The Cardinality between the GDT Property Value 21400 and the IntegerValue 21445*a* is zero or one 21453*a*.

The LowerIntegerValue 21454*a* is a lower limit in a value interval of integer values. The LowerIntegerValue 21454*a* is of type GDT: IntegerValue. For the LowerIntegerValue 21454*a*, the Category is Element 21455*a*, the Object Class is Integer Specification 21456*a*, the Property Quality term is Lower 21457*a*, the Property is Integer Value 21458*a*, the Representation/Association Quality term is Integer 21459*a*, the Representation/Association term is Value 21460*a*, the Type term is GDT 21461*a*, and the Type Name term is IntegerValue 21462*a*. The Cardinality between the GDT Property Value 21400 and the LowerIntegerValue 21454*a* is zero or one 21463*a*.

The UpperIntegerValue 21464*a* is an upper limit in a value interval of integer values. The UpperIntegerValue 21464*a* is of type GDT: IntegerValue. For the UpperIntegerValue 21464*a*, the Category is Element 21465*a*, the Object Class is Integer Specification 21466*a*, the Property Quality term is Upper 21467*a*, the Property is Integer Value 21468*a*, the Representation/Association Quality term is Integer 21469*a*, the Representation/Association term is Value 21470*a*, the Type term is GDT 9971, and the Type Name term is IntegerValue 21472*a*. The Cardinality between the GDT Property Value 21400 and the UpperIntegerValue 21464*a* is zero or one 21473*a*.

The DateSpecification 21474*a* contains the specification of calendar days or date intervals. For the DateSpecification 21474*a*, the Category is Element 21475*a*, the Object Class is Property Value 21476*a*, the Property is Date Specification 21477*a*, and the Representation/Association term is Details 21478*a*. The Cardinality between the GDT Property Value 21400 and the DateSpecification 21474*a* is zero or one 21479*a*.

The Date 21480*a* is a calendar day. The Date 21480*a* is of type GDT: Date. For the Date 21480*a*, the Category is Element 21481*a*, the Object Class is Date Specification 21482*a*, the Representation/Association term is Date 21483*a*, the Type term is GDT 21484*a*, and the Type Name term is Date 21485*a*. The Cardinality between the GDT Property Value 21400 and the Date 21480*a* is zero or one 21486*a*.

The StartDate 21487*a* is a date that defines the start of a daily time interval. The StartDate 21487*a* is of type GDT: Date. For the StartDate 21487*a*, the Category is Element 21488*a*, the Object Class is Date Specification 21489*a*, the Property is Start 21490*a*, the Representation/Association term is Date 21491*a*, the Type term is GDT 21492*a*, and the Type Name term is Date 21493*a*. The Cardinality between the GDT Property Value 21400 and the StartDate 21487*a* is zero or one 21494*a*.

The EndDate 21495*a* is a date that defines the end of a daily time interval. The EndDate 21495*a* is of type GDT: Date. For the EndDate 21495*a*, the Category is Element 21496*a*, the Object Class is Date Specification 21497*a*, the Property is End 21498*a*, the Representation/Association term is Date 21499*a*, the Type term is GDT 21401*b*, and the Type Name term is Date 21402*b*. The Cardinality between the GDT Property Value 21400 and the EndDate 21495*a* is zero or one 21403*b*.

The TimeSpecification 21404*b* contains the specification, accurate to the second, of a particular time or time interval (time span). For the TimeSpecification 21404*b*, the Category is Element 21405*b*, the Object Class is PropertyValue 21406*b*, the Property is Time Specification 21407*b*, and the Representation/Association term is Details 21408*b*. The Cardinality between the GDT Property Value 21400 and the TimeSpecification 21404*b* is zero or one 21409*b*.

The Time 21410*b* is a particular time, accurate to the second. The Time 21410*b* is of type GDT: Time. For the Time 21410*b*, the Category is Element 21411*b*, the Object Class is Time Specification 21412*b*, the Representation/Association term is Time 21413*b*, the Type term is GTD 21414*b*, and the Type Name term is Time 21415*b*. The Cardinality between the GDT Property Value 21400 and the Time 21410*b* is zero or one 21416*b*.

The StartTime 21417*b* is a time that defines the start of a particular time interval, accurate to the second. The StartTime 21417*b* is of type GDT: Time. For the StartTime 21417*b*, the Category is Element 21418*b*, the Object Class is Time Specification 21419*b*, the Property is Start 21420*b*, the Representation/Association term is Time 21421*b*, the Type term is GDT 21422*b*, and the Type Name term is Time 21423*b*. The Cardinality between the GDT Property Value 21400 and the StartTime 21417*b* is zero and one 21424*b*.

The EndTime 21425*b* is a time that defines the end of a particular time interval, accurate to the second. The EndTime 21425*b* is of type GDT: Time. For the EndTime 21425*b*, the Category is Element 21426*b*, the Object Class is Time Specification 21427*b*, the Property is End 21428*b*, the Representation/Association term is Time 21429*b*, the Type term is GDT 21430*b*, and the Type Name term is Time 21431 *b*. The Cardinality between the GDT Property Value 21400 and the EndTime 21425*b* is zero or one 21432*b*.

The DateTimeSpecification 21433*b* contains the specification of time stamps (date and time), accurate to the second, or the specification of a timeframe, accurate to the second. For the DateTimeSpecification 21433*b*, the Category is Element 21434*b*, the Object Class is Property Value 21435*b*, the Property is Date Time Specification 21436*b*, and the Representation/Association term is Details 21437. The Cardinality between the GDT Property Value 21400 and the DateTimeSpecification 21433*b* is zero or one 21438*b*.

The DateTime 21439*b* is a time stamp (date and time), accurate to the second. The DateTime 21439*b* is of type GDT: DateTime. For the DateTime 21439*b*, the Category is Element 21440*b*, the Object Class is Date Time Specification 21441*b*, the Representation/Association term is Date Time 21442*b*, the Type term is GDT 21443*b*, and the Type Name term is DateTime 21444*b*. The Cardinality between the GDT Property Value 21400 and the DateTime 21439*b* is zero or one 21445*b*.

The StartDateTime 21446*b* is a time stamp that defines the start of a time interval or timeframe. The StartDateTime 21446*b* is of type GDT: DateTime. For the StartDateTime 21446*b*, the Category is Element 21447*b*, the Object Class is Date Time Specification 21448*b*, the Property is Start 21449*b*, the Representation/Association term is Date Time 21450*b*, the Type term is GDT 21451*b*, and the Type Name is DateTime 21452*b*. The Cardinality between the GDT Property Value 21400 and the StartDateTime 21446*b* is zero or one 21453*b*.

The EndDateTime 21454*b* is a time stamp that defines the end of a time interval or timeframe. The EndDateTime 21454*b* is of type GDT: DateTime. For the EndDateTime 21454*b*, the Category is Element 21455*b*, the Object Class is Date Time Specification 21456*b*, the Property is End 21457*b*, the Representation/Association term is Date Time 21458*b*, the Type term is GDT 21459*b*, and the Type Name term is DateTime 21460*b*. The Cardinality between the GDT Property Value 21400 and the EndDateTime 21454*b* is zero or one 21461*b*.

The NameSpecification 21462*b* contains the specification of qualitative and human-readable values. For the NameSpecification 21462*b*, the Category is Element 21463*b*, the Object Class is Property Value 21464*b*, the Property is Name Specification 21465*b*, and the Representation/Association term is Details 21466*b*. The Cardinality between the GDT Property Value 21400 and the NameSpecification 21462*b* is zero or one 21467*b*.

The Name 21468*b* is an individual qualitative and human-readable value. The Name 21468*b* is of type GDT: Name. For the Name 21468*b*, the Category is Element 21469*b*, the Object Class is Name Specification 21470*b*, the Property is Name 21471*b*, the Representation/Association term is Name 21472*b*, the Type term is GDT 21473*b*, and the Type Name term is Name 21474*b*. The Cardinality between the GDT Property Value 21400 and the Name 21468*b* is zero or one 21475*b*.

The IndicatorSpecification 21476*b* contains the specification of binary logical values (such as, yes and no). For the IndicatorSpecification 21476*b*, the Category is Element 21477*b*, the Object Class is Property Value 21478*b*, the Property is Indicator Specification 21479*b*, and the Representation/Association term is Details 21480*b*. The Cardinality between the GDT Property Value 21400 and the IndicatorSpecification 21476*b* is zero or one 21481*b*.

The Indicator 21482*b* is an individual binary logical value. The Indicator 21482*b* is of type GDT: Indicator. For the Indicator 21482*b*, the Category is Element 21483*b*, the Object Class is Indicator Specification 21484*b*, the Property is Indicator 21485*b*, the Representation/Association term is Indicator 21486*b*, the Type term is GDT 21487*b*, and the Type Name term is Indicator 21488*b*. The Cardinality between the GDT Property Value 21400 and the Indicator 21482*b* is zero or one 21489*b*.

The IntervalTypeCode 21490*b* is a coded representation for typing intervals. The IntervalTypeCode 21490*b* is of type GDT: IntervalTypeCode. For the IntervalTypeCode 21490*b*, the Category is Element 21491*b*, the Object Class is Property Value 21492*b*, the Property is Interval Type 21493*b*, the Representation/Association term is Code 21494*b*, the Type term is GDT 21495*b*, and the Type Name term is IntervalTypeCode 21496*b*. The Cardinality between the GDT Property Value 21400 and the IntervalTypeCode 21490*b* is zero or one 21497*b*.

The PreferredName 21498*b* is a name of the value or value interval, if one exists. The PreferredName 21498*b* is of type GDT: Name. For the PreferredName 21498*b*, the Category is Element 21499*b*, the Object Class is Property Value 21401*c*, the Property is Preferred Name 21402*c*, the Representation/Association term is Name 21403*c*, the Type term is GDT 21404*c*, and the Type Name is Name 21405*c*. The Cardinality between the Property Value 21400 and the PreferredName 21498*b* is from zero to n 21406*c*.

The SynonymousName 21407*c* is a synonymous term for the PreferredName. The SynonymousName 21407*c* is of type GDT: Name. For the SynonymousName 21407*c*, the Category is Element 21408*c*, the Object Class is Property Value 21409*c*, the Property is Synonymous Name 21410*c*, the Representation/Association term is Name 21411*c*, the Type term is GDT 21412*c*, and the Type Name term is Name 21413*c*. The Cardinality between the Property Value 21400 and the SynonymousName 21407*c* is from zero to n 21414*c*.

The AbbreviationName 21415*c* is an abbreviation of the PreferredName. The AbbreviationName 21415*c* is of type GDT: Name. For the AbbreviationName 21415*c*, the Category is Element 21416*c*, the Object Class is Property Value 21417*c*, the Property is Abbreviation Name 21418*c*, the Representation/Association term is Name 21419*c*, the Type term is GDT 21420*c*, and the Type Name term is Name 21421*c*. The Cardinality between the Property Value 21400 and the AbbreviationName 21415*c* is from zero to n 21422*c*.

The IconAttachment 21423*c* is a graphic that illustrates the meaning of the value or value interval. The IconAttachment 21423*c* is of type GDT: Attachment. For the IconAttachment 21423*c*, the Category is Element 21424*c*, the Object Class is Property Value 21425*c*, the Property is Icon 21426*c*, the Representation/Association term is Attachment 21427*c*, the Type term is GDT 21428*c*, and the Type Name term is Attachment 21429*c*. The Cardinality between the Property Value 21400 and the IconAttachment 21423*c* is zero or one 21430*c*.

The AttachmentWebAddress 21431*c* is a reference to a WebAddress on the basis of which the value was defined. This attachment could be an explanatory drawing or a colored pattern. The AttachmentWebAddress 21431*c* is of type GDT: WebAddress. For the AttachmentWebAddress 21431*c*, the Category is Element 21432*c*, the Object Class is Property Value 21433*c*, the Property is Attachment 21434*c*, the Representation/Association term is Web Address, the Type term is GDT 21436*c*, and the Type Name term is WebAddress 21437*c*. The Cardinality between the Property Value 21400 and the AttachmentWebAddress 21431*c* is zero or one 21438*c*.

Illustrative integrity conditions for 21400 are as follows. When AmountSpecification, QuantitySpecification, DecimalSpecification, FloatSpecification, IntegerSpecification, DateSpecification, TimeSpecification, or DateTimeSpecification are used, single values may be specified by Amount, Measure, Quantity, Value, Date, Time, or DateTime. Single values and intervals cannot be specified at the same time. When LowerAmount or UpperAmount, LowerQuantity or UpperQuantity, LowerDecimal or UpperDecimal, LowerFloat or UpperFloat, LowerInteger or UpperInteger, StartDate or EndDate, StartTime or EndTime, or StartDateTime or EndDateTime are used, the respective complementary Upper or Lower field or Start or End field may be filled. The PreferredName and AbbreviationName fields may be filled once per language. IntervalTypeCode may be specified when the value is an interval (also <, <=, and the like). See for example, ISO13584/42.

Examples of AmountSpecification include defining a price interval, either a LowerAmount or UpperAmount for a product.

Examples of QuantitySpecification include valuating properties whose data types are in units, e.g., 5 pieces, 7 kg.

Examples of DecimalSpecification/FloatSpecification include valuating nondimensional, numeric properties e.g., ratios, calculation indexes, key figures, and so on.

Examples of IntegerSpecification include valuating nondimensional, integer properties, e.g., codes, indexes, and sequential numbers.

Examples of DateSpecification include an expiration date or best-before date, a date of manufacture, a filling date, a packaging date, a release date, a lock date, an order date, a delivery date, a storage period, and the like.

Examples of TimeSpecification/DateTimeSpecification include time stamp, accurate to the second, for specifying a filling time, production time, inspection time, and the like.

Examples of NameSpecification include red, green, and the like, for the color of the property.

Examples of Indicator Specification include properties that can have one of two statuses as their valuation, e.g., yes/no, on/off.

(xxxxxxx) PurchaseOrderOrderedIndicator

A GDT PurchaseOrderOrderedindicator 21500 indicates whether a purchase order has been sent to a vendor or not. An example is: (In the context of the PurchaseOrder)

<OrderedIndicator>true</OrderedIndicator>.

The structure of GDT Purchase Order Ordered Indicator 21500 is depicted in FIG. 215. For the GDT Purchase Order Ordered Indicator 21500, the Object Class is Purchase Order 21502, the Property is Ordered Indicator 21504, the Representation/Association term is Indicator 21506, and the Type term is CCT: Indicator 21508.

The PurchaseOrderOrderedIndicator 21500 can have the following values, either 1) true, meaning that the purchase order has been sent to a vendor; or 2) false, meaning that the purchase order has not yet been sent to a vendor.

For value range, see CCT Indicator.

The PurchaseOrderOrderedIndicator 21500 indicates whether or not a purchase order has been sent to a vendor. This makes it possible to distinguish between purchase orders that have already been sent to a vendor and purchase orders that are still being processed.

(yyyyyyy) PurchasingGroupID

A GDT PurchasingGroupID 21600 is a unique identifier for a group of buyers who are responsible for certain purchasing activities. An example is: <PurchasingGroupID>1234567</PurchasingGroupID>.

The structure of GDT Purchasing Group ID 21600 is depicted in FIG. 216. For the GDT Purchasing Group ID 21600, the Object Class is Purchasing Group 21602, the Property is Identification 21604, the Representation/Association term is Identifier 21606, the Type term is CCT 21608, the Type Name term is Identifier 21610, and the Length is from one to twenty 21612.

An in-house purchasing group may be responsible for procuring a product or class of products. Externally, the group acts as a contact for vendors. The PurchasingGroupID 21600 can be a maximum of 20 alphanumerical characters long. For the external representation, role-based IDs (e.g., BuyerPurchasingGroupID) based on the CCT: Identifier can be used without additional attributes—they are unique in conjunction with the identification of the party described by the role (e.g., BuyerID). The PurchasingGroupID 21600 is used externally in cooperative business processes, in particular in the vendor-managed inventory (VMI) business process, to uniquely identify the purchasing group of the party involved. In this scenario, the buyer, such as a retail company, sends purchase order numbers to the vendor, together with its PurchasingGroupID (i.e., the "BuyerPurchasingGroupID," from the vendor's point of view) so that the purchase orders created by the vendor can be generated depending on the buyer's purchasing group identification.

(zzzzzzz) Quantity

A GDT Quantity 21700 is the non-monetary numerical specification of an amount in a unit of measurement. An example is: <OrderedQuantity unitCode="CT">100</OrderedQuantity>(CT=Carton).

The structure of GDT Quantity 21700 is depicted in FIG. 217. A quantity is the result of the numerical comparison of the number, amount, or size of a given item or attribute and a standard number, amount, or size. Depending on the item or attribute to be qualified and the business context, the comparison can be made by physically measuring or counting. Positive and negative entries are possible using the built-in data type "xsd:decimal." Negative entries may be prefixed with a negative sign ("–"). However, positive entries do not have to be prefixed with a positive sign ("+"). The GDT Quantity 21700 includes attribute unitCode 21710. For the GDT Quantity 21700, the Representation/Association term is Quantity 21702, the Type term is xsd 21704, the Type Name term is Decimal 21706, and the Length is thirteen six 21708. For the unitCode 21710, the Category is Attribute 21712, the Object Class is Quantity 21714, the Property is Unit 21716, the Representation/Association term is Coe 21718, the Type term is xsd 21720, the Type Name term is Token 21722, and the Length is from one to three 21724. The Cardinality between the GDT Quantity 21700 and the unitCode 21710 is one 21726.

The permitted variations of the "unitCode" attribute are described in more detail in the "MeasureUnitCode" GDT.

Quantity 21700 may be used to specify the amount of a (manufactured, ordered, transported, delivered, and the like) product. In each given context, a decision may be made as to whether an amount (Quantity) or a physical measurement (Measure) is being specified. For this purpose, the physical units (PhysicalMeasureUnits) used in Measure form a subset of the measurement units (MeasureUnits) used in Quantity.

MeasureUnitCode helps to determine the "unitCode 21710" attribute.

(aaaaaaaa) QuantityDiscrepancyCode

The GDT QuantityDiscrepancyCode 21800 is a coded representation of the cause of or reason for a quantity discrepancy. An example is:

<QuantityDiscrepancyCode>AE</QuantityDiscrepancyCode>.

The structure of GDT QuantityDiscrepancyCode 21800 is depicted in FIG. 218. For the GDT QuantityDiscrepancyCode 21800, the Object Class is Quantity 21802, the Property is Discrepancy 21804, the Representation/Association term is Code 21806, the Type term is CCT 21808, the Type Name term is Code 21810, and the Length is from one to four 21812. The GDT QuantityDiscrepancyCode 21800 may be a restricted GDT.

Illustrative GDT QuantityDiscrepancyCode 21800 values in the "goods receipt process" are as follows: 1) AC, which represents an over delivery (on receipt of the goods, a surplus quantity was established in relation to the previously notified delivery); 2) AE, which represents goods delivered but not notified (on receipt of the goods, quantities of goods were established that were delivered without prior notification in the form of a shipping notification); 3) AF, which represents delivered goods are damaged (on receipt of the goods, damaged quantities were found); and 4) AG, which represents goods delivered too late (on receipt of the goods, quantities of goods were established that were already notified in an earlier delivery).

The GDT QuantityDiscrepancyCode 21800 refers to UN/EDIFACT 4221 (Discrepancy nature identification code) and contains the codes from this list that are relevant for quantity discrepancies. The GDT QuantityDiscrepancyCode 21800 describes the cause of a quantity discrepancy in a delivery that was established in the goods receipt process (generally with regard to a location product.) This coded information may be returned to the sender of the goods by means of a goods receipt notification. The codes for indicating under deliveries of goods and goods that are delivered too late could not be found in the current UN/EDIFACT code list. These two codes may still need to be requested and added as list values.

(bbbbbbbb) QuantityTimeSeries

A CDT QuantityTimeSeries 21900 is time series information that consists of items that each contain a period with a start time and end time and a period-based quantity. An example is:

```
<QuantityTimeSeries>
    <Item>
        <ValidityPeriod>
        <StartDateTime>2002-04-19T15:00:00Z</StartDateTime>
        <EndDateTime>2002-04-19T17:00:00Z</EndDateTime>
        </ValidityPeriod>
        <Quantity unitCode="PC" >150</Quantity>
    </Item>
</QuantityTimeSeries>.
```

The structure of GDT Quantity-TimeSeries 21900 is depicted in FIG. 219. The GDT Quantity-TimeSeries 21900 includes element Item 21914. For the GDT Quantity-TimeSeries 21900, the Object Class Quality term is Quantity 21902, the Object Class is TimeSeries 21904, the Representation/Association term is Details 21906, the Type term is GDT 21908, and the Type Name term is TimeSeries 21910. The GDT Quantity-TimeSeries 21900 may be a restricted GDT.

The QuantityTimeSeriesItem 21914 is an item in a time series and can be repeated as often as required. For the Item 21914, the Category is Element 21916, the Object Class is TimeSeries 21918, the Property is Item 21920, and the Representation/Association term is Details 21922. The Cardinality between the GDT Quantity-TimeSeries 21900 and the Item 21914 is from one to n 21924.

The ValidityPeriod 21926 describes the validity period of the time series item with a start time stamp and an end time stamp. For the Validity Period 21926, the Category is Element 21928, the Object Class is TimeSeries 21930, the Property is ValidityPeriod 21932, the Representation/Association term is Details 21934, the Type term is GDT 21936, and the Type Name term is DateTimePeriod 21938. The Cardinality between the GDT Quantity-TimeSeries 21900 and the Item 21914 Validity Period 21926 is one 21940.

The Quantity 21942 describes the quantity connected with the time series item. For the Quantity 21942, the Category is Element 21944, the Object Class is TimeSeries 21946, the Property is Quantity 21948, the Representation/Association term is Quantity 21950, the Type term is GDT 21952, and the Type Name term is Quantity 21954. The Cardinality between the GDT Quantity-TimeSeries 21900 and the Quantity 21942 is one 21956.

The FixedIndicator 21958 describes whether the corresponding item is blocked for changes or not. For the Fixed-Indicator 21958, the Category is Element 21960, the Object Class is TimeSeries 21962, the Property is FixedIndicator 21964, the Representation/Association term is Indicator 21966, the Type term is GDT 21968, and the Type Name term is FixedIndicator 21970. The Cardinality between the GDT Quantity-TimeSeries 21900 and the Fixed-Indicator 21958 is zero or one 21972.

CDT QuantityTimeSeries 21900 is used as a generic data type that can have various specifications in an interface depending on the context category used, e.g., "Sales," to describe sales quantities; "Consumption," to describe consumption quantities, and the like.

(cccccccc) QuantityTolerance

A GDT QuantityTolerance 22000 is the tolerated difference between a requested and an actual quantity (e.g., a delivery quantity) as a percentage. An example is:

```
<QuantityTolerance>
    <OverPercent>33.0</OverPercent>
    <UnderPercent>1.0</UnderPercent>
</QuantityTolerance>.
```

The structure of GDT QuantityTolerance 22000 is depicted in FIG. 220. The GDT QuantityTolerance 22000 includes elements OverPercent 22008, OverPercentUnlimitedIndicator 22024, and UnderPercent 22040. For the GDT Quantity-Tolerance 22000, the Object Class is QuantityTolerance 22002, the Property is Details 22004, and the Representation/Association term is Details 22006. GDT QuantityTolerance 22000 comprises the three elements OverPercent 22008 and UnderPercent 22040 from "CCT: Numeric" and OverPercentUnlimitedIndicator from the CCT: Indicator.

For the OverPercent 22008, the specification of a value x in this field means that for an ordered quantity of Y, up to x % of Y are accepted additionally. Therefore, the specification in this field is to be understood as a percentually relative specification. The specification is made as a decimal with a total of 4 digits, including one position after the decimal point, without plus/minus sign (e.g., 15.5). A specification of 0 in OverPercent 22008 means that the ordered quantity may not be exceeded. If the OverPercent 22008 and also the OverPercentUnlimitedIndicator 22024 are not specified, this also means that the ordered quantity may not be exceeded. For example, for an ordered quantity of 50 pieces and an OverPercent 22008 entry equal to 10, up to 5 more pieces would be accepted, thus altogether a maximum quantity of 55 pieces. For the OverPercent 22008, the Category is Element 22010, the Object Class is QuantityTolerance 22012, the Property is Over 22014, the Representation/Association term is Percent 22016, the Type term is GDT 22018, and the Type Name term is GDT: Percent 22020. The Cardinality between the GDT QuantityTolerance 22000 and the OverPercent 22008 is zero or one 22022.

For the OverPercentUnlimitedIndicator 22024, making an entry in this field means that no limitations may be made regarding the degree of fulfillment upwards. The OverPercentUnlimitedIndicator 22024 applies to the upper limit. The OverPercent 22008 and the OverPercentUnlimitedIndicator 22024 cannot be specified at the same time; however, the UnderPercent 22040 and the OverPercentUmlimitedIndicator 22024 can be set simultaneously. For the OverPercentUnlimitedIndicator 22024, the Category is Element 22026, the Object Class is QuantityTolerance 22028, the Property is OverPercentUnlimited 22030, the Representation/Association term is Indicator 22032, the Type term is GDT 22034, and the Type Name term is GDT: ValueUnlimitedIndicator 22036. The Cardinality between the GDT QuantityTolerance 22000 and the OverPercentUnlimitedIndicator 22024 is zero or one 22038.

If no OverPercentUnlimitedIndicator 22024 is set, the default value may be "false." The specification is made as a Boolean entry of length 1. The following illustrative values are allowed: 1) true, meaning that any overrun is accepted; and 2) false, meaning that overruns are not accepted.

For the UnderPercent 22040, the entry of a value x in this field means that for an ordered quantity of Y, up to x % of Y less are accepted. Therefore, the specification in this field is to be understood as a percentually relative specification. The specification is made as a decimal with a total of 4 digits, including one position after the decimal point, without plus/minus sign (e.g., 15.5). A specification of 0 in UnderPercent 22040 means that the ordered quantity may not be short. If the UnderPercent 22040 is not entered, this also means that the ordered quantity may not be short. For example: For an ordered quantity of 50 pieces and an UnderPercent 22040 entry=10, up to 5 pieces less would be accepted, so altogether at least 45 pieces. Using a separate entry of OverPercent 22008 and UnderPercent 22040, it is possible, e.g., to accept too high a quantity as this could perhaps be covered by a particular stock, but to reject the delivery of too small a quantity, e.g., to avoid a production standstill. For the UnderPercent 22040, the Category is Element 22042, the Object Class is QuantityTolerance 22044, the Property is Under 22046, the Representation/Association term is Percent 22048, the Type term is GDT 22050, and the Type Name term is GDT: Percent 22052. The Cardinality between the GDT QuantityTolerance 22000 and the UnderPercent 22040 is zero or one 22054.

The fields OverPercent and OverPercentUnlimitedIndicator are mutually exclusive, i.e., entering "true" in the OverPercentUnlimitedIndicator and, at the same time, filling the OverPercent does not make sense.

The QuantityTolerance specifies (as a percentage) the difference to be/that can be tolerated between a required or requested quantity and an actual quantity (delivery quantity). The specification is made separately for an over quantity or shortfall.

See, for example, UN/EDIFACT: Segment QVR (QUANTITY VARIANCES)—Data Elements 6064 (Quantity variance value): n . . . 15 (up to 15 numeric characters), and R/3: DEC 3.1 (calculation or amount field with comma and plus/minus sign).

(dddddddd) Recurrence

A GDT Recurrence 22100 is a representation for the repeated occurrence of an event within a time period or within a timeframe. There may be four types of recurrence: 1) a number of recurrences within a time period; 2) the recurrences each take place after a determined period duration within a time period; 3) a number of recurrences within a timeframe; and 4) the recurrences each take place after a determined period duration within a timeframe.

The structure of GDT Recurrence 22100 is depicted in FIG. 221. The GDT Recurrence 22100 includes Duration 22106 and Value 22120. For GDT Recurrence 22100, the Object Class is Recurrence 22102 and the Representation/Association term is Details 22104.

A timeframe (duration) is a time without reference to a specific starting point or end point. Examples of a time frame include: "Day," "Week," or "Year." A time period (period) is a concrete time in terms of a starting point and/or an end point. Examples of a time period include: "10.1.2003 to 20.01.2003" or "40 days starting on 2.1.2004." The 4 cases listed in the definition of 22100 differ in terms of the type of basic range that the recurrences refer to (time period or timeframe), and the type in which the recurrences are specified (fixed number or specification of a period duration for which a recurrence occurs).

In summary, the Time period has a Fixed number of Case a) and a Period duration of Case b). The Timeframe has a Fixed number of Case c) and a Period duration of Case d). See the table below.

| | Fixed number | Period duration |
|---|---|---|
| Time period | Case a) | Case b) |
| Timeframe | Case c) | Case d) |

Examples of the 4 types of Recurrence 22100 are as follows:

Type 1: "4 recurrences between 1.7.2003 and 15.10.2003."

Type 2: "weekly recurrences between 12.4.2004 and 6.6.2004."

Type 3: "2 recurrences in one month," "8 recurrences in 50 days."

Type 4: "weekly recurrences in one month," "daily recurrences in 50 days."

The timeframe as "abstract" time specification should not be confused with time period as the "concrete" time specification. The number of recurrences in a timeframe is valid for each "occurrence" of this timeframe. For example, after one week, the same number of recurrences also takes place in the following week.

Since a time period is a concrete time and may not occur more than once, the number of recurrences relates to this time period. A recurrence does not have to be regular. The Recurrence 22100 covers both regular and irregular recurrences.

Below is an example (instance):

```
<Recurrence>
    <Duration>P7D</Duration>
    <Value>1</Value>
</Recurrence>
```

The structure of GDT Recurrence 22100 is depicted in FIG. 221. The GDT first supports type 3 from the types of recurrence specified in the definition. The GDT Recurrence 22100 includes Duration 22106 and Value 22120. For GDT Recurrence 22100, the Object Class is Recurrence 22102 and the Representation/Association term is Details 22104.

The Duration 22106 specifies the timeframe within which the specified number of recurrences takes place. For the Duration 22106, the Object Class is Recurrence 22108, the Property is Duration 22110, the Representation/Association term is Duration 22112, the Type term is GDT 22114, and the Type Name term is Duration 22116. The Cardinality between the GDT Recurrence 22100 and the Duration 22106 is one 22118.

The Value 22120 specifies the number of recurrences (in terms of the timeframe). For the Value 22120, the Object Class is Recurrence 22122, the Property is Value 22124, the Representation/Association term is Value 22126, the Type term is GDT 22128, the Type Name is IntegerValue 22130, and the Length is from one to three 22132. The Cardinality between the GDT Recurrence 22100 and the Value 22120 is one 22134.

The timeframe, or duration, may not be a timeframe in the sense of a validity duration.

(eeeeeeee) RegionCode

The GDT RegionCode 22200 is a coded representation of logically or physically linked geographical or political regions that have one or more attributes in common. An example is:

<RegionCode>BW</RegionCode>.

The structure of GDT RegionCode 22200 is depicted in FIG. 222. The default setting of RegionCode is the list of Country Subdivision Codes according to ISO 3166-2. If the region is not available within ISO 3166-2, the code list from the relevant country or the issuing agency should be used instead. The GDT RegionCode 22200 includes attributes listID 22212, listVersionID 22230, listAgencyID 22248, listAgencySchemeID 22266, and listAgencySchemeAgencyID 22284. For the GDT RegionCode 22200, the Object Class is Region 22202, the Property is Identification 22204, the Representation/Association term is Code 22206, the Type term is CCT 22208, and the Type Name term is Code 22210.

The listID 22212 identifies a list of the codes that belong together. The listID 22212 is unique within the agency that manages this code list. For the listID 22212, the Category is Attribute 22214, the Object Class is CodeList 22216, the Property is Identification 22218, the Representation/Association term is Identifier 22220, the Type term is xsd 22222, the Type Name term is Token 22224, and the Length is from one to sixty 22226. The Cardinality between the GDT RegionCode 22200 and the listID 22212 is zero or one 22228.

The listVersionID 22230 identifies the version of a code list. For the listVersionID 22230, the Category is Attribute 22232, the Object Class is CodeList 22234, the Property is Version 22236, the Representation/Association term is Identifier 22238, the Type term is xsd 22240, the Type Name term is Token 22242, and the Length is from one to fifteen 22244. The Cardinality between the GDT RegionCode 22200 and the listVersionID 22230 is zero or one 22246.

The listAgencyID 22248 identifies the agency that manages the code list. The agencies from DE 3055 may be used as the default, but in an embodiment the roles defined in DE 3055 may not be used. For the listAgencyID 22248, the Category is Attribute 22250, the Object Class is CodeListAgency 22252, the Property is Identification 22254, the Representation/Association term is Identifier 22256, the Type term is xsd 22258, the Type Name term is Token 22260, and the Length is from one to sixty 22262. The Cardinality between the GDT RegionCode 22200 and the listAgencyID 22248 is zero or one 22264.

The listAgencySchemeID 22266 identifies the identification scheme that represents the context for agency identification. For the listAgencySchemeID 22266, the Category is Attribute 22268, the Object Class is CodeListAgency 22270, the Property is Scheme 22272, the Representation/Association term is Identifier 22274, the Type term is xsd 22276, the Type Name term is Token 22278, and the Length is from one to sixty 22280. The Cardinality between the GDT RegionCode 22200 and the listAgencySchemeID 22266 is zero or one 22282.

The listAgencySchemeAgencyID 22284 identifies the agency that manages the listAgencySchemeID. This attribute can contain values from DE 3055 (excluding roles). For the listAgencySchemeAgencyID 22284, the Category is Attribute 22286, the Object Class is CodeListAgency 22288, the Property is SchemeAgency 22290, the Representation/Association term is Identifier 22292, the Type term is xsd 22294, the Type Name term is Token 22296, and the Length is three 22298. The Cardinality between the GDT RegionCode 22200 and the listAgencySchemeAgencyID 22284 is zero or one 22201.

Examples of the RegionCode are: structure regions (e.g., Munich metropolitan area); program regions (e.g., promotion programs), settlements, administrative regions (e.g., federal states), grid squares, economic regions, and the like.

The RegionCode may be restricted to ISO 3166-2. However, to ensure that further code lists can be used, the optional attributes "listID 22212," "listVersionID 22230," "listAgency 22248," "listAgencySchemeID 22266," and "listAgencySchemeAgencyID 22284" are also included in that illustrative case. For more details, see the "SAP Core Component Types"specification document.

(ffffffff) RequiredIndicator

A GDT RequiredIndicator 22300 indicates whether something is required or not. The word "something" generally stands for specific procedures, operations or events. An example is:

<SeparatorSignRequiredIndicator>true</SeparatorSignRequiredIndicator>.

The structure of GDT RequiredIndicator 22300 is depicted in FIG. 223.

The RequiredIndicator can have the following values, either 1) true, meaning that something is required; or 2) false, meaning that something is not required. (For value range, see CCT:Indicator.)

For each GDT RequiredIndicator 22300, what is required or not required is specified. This is reflected in an appropriate name prefix. For example, a SeparatorSignRequiredIndicator indicates whether a separator is required or not. The GDT RequiredIndicator 22300 can be used, e.g., to indicate whether prices always have to be specified with a thousands separator. In the context of an interface, the business significance of "what is required" may be described for the GDT RequiredIndicator 22300 in addition to its name prefix (see Integrity Conditions).

(gggggggg) RevisionQuantityTimeSeries

A GDT RevisionQuantityTimeSeries 22400 is revised time series information that consists of items that each contain a period with a start time and end time, a period-based quantity, and the reason for the changes. An example or instance is:

```
<RevisionQuantityTimeSeries>
    <Item>
        <ValidityPeriod>
        <StartDateTime>2002-04-19T15:00:00Z</StartDateTime>
        <EndDateTime>2002-04-19T17:00:00Z</EndDateTime>
        <ValidityPeriod>
        <Quantity unitCode="PC" >150</Quantity>
<AdjustmentReasonCode>Cancelled_Promotion</
AdjustmentReasonCode>
    <Item>
</RevisionQuantityTimeSeries>.
```

The structure of GDT RevisionQuantityTimeSeries 22400 is depicted in FIG. 224. The GDT RevisionQuantityTimeSeries 22400 includes elements Item 22414, Validity Period 22426, StartDateTime 22442, EndDateTime 22458, Quantity 22474, Fixed-Indicator 22490, Adjustment-ReasonCode 22407, and Note 22423. For the GDT RevisionQuantityTimeSeries 22400, Object Class Quality term is RevisionQuantity 22402, the Object Class is TimeSeries 22404, the Representation/Association term is Details 22406, the Type term is GDT 22408, and the Type Name term is TimeSeries 22410. The GDT RevisionQuantityTimeSeries 22400 may be a restricted GDT.

RevisionQuantityTimeSeriesItem 22414 is an item in a time series and can be repeated as often as required. For the Item 22414, the Category is Element 22416, the Object Class is TimeSeries 22418, the Property is Item 22420, and the Representation/Association term is Details 22422. The Cardinality between the GDT RevisionQuantityTimeSeries 22400 and the Item 22414 is from one to n 22424.

ValidityPeriod 22426 describes the validity period of the time series item. For the Validity Period 22426, the Category is Element 22428, the Object Class is TimeSeries 22430, the Property is ValidityPeriod 22432, the Representation/Association term is Details 22434, the Type term is GDT 22436, and the Type Name term is DateTimePeriod 22438. The Cardinality between the GDT RevisionQuantityTimeSeries 22400 and the Validity Period 22426 is one 22440. For the StartDateTime 22442, the Category is Element 22444, the Object Class is TimeSeries 22446, the Property is ValidityPeriodStart 22448, the Representation/Association term is DateTime 22450, the Type term is GDT 22452, and the Type Name term is DateTime 22454. The Cardinality between the GDT RevisionQuantityTimeSeries 22400 and the StartDateTime 22442 is one 22456. For the EndDateTime 22458, the Category is Element 22460, the Object Class is TimeSeries 22462, the Property is ValidityPeriodEnd 22464, the Representation/Association term is DateTime 22466, the Type term is GDT 22468, and the Type Name term is DateTime 22470. The Cardinality between the GDT RevisionQuantityTimeSeries 22400 and the EndDateTime 22458 is one 22472.

Quantity 22474 describes the quantity connected with the time series item. For the Quantity 22474, the Category is Element 22476, the Object Class is TimeSeries 22478, the Property is Quantity 22480, the Representation/Association term is Quantity 22482, the Type term is GDT 22484, and the Type Name term is Quantity 22486. The Cardinality between the GDT RevisionQuantityTimeSeries 22400 and the Quantity 22474 is one 22488.

FixedIndicator 22490 indicates whether the corresponding item is blocked for changes or not. For the Fixed-Indicator 22490, the Category is Element 22492, the Object Class is TimeSeries 22494, the Property is FixedIndicator 22496, the Representation/Association term is Indicator 22498, the Type term is GDT 22401, and the Type Name term is FixedIndicator 22403. The Cardinality between the GDT RevisionQuantityTimeSeries 22400 and the Fixed-Indicator 22490 is zero or one 22405.

AdjustmentReasonCode 22407 describes the reason for a change to the item, if there is one. For the Adjustment-ReasonCode 22407, the Category is Element 22409, the Object Class is TimeSeries 22411, the Property is AdjustmentReason 22413, the Representation/Association term is Code 22415, the Type term is GDT 22415, the Type Name term is AdjustmentReasonCode 22419. The Cardinality between the GDT RevisionQuantityTimeSeries 22400 and the Adjustment-ReasonCode 22407 is zero or one 22421.

For the Note 22423, the Category is Element 22425, the Object Class is TimeSeries 22427, the Property is Note 22429, the Representation/Association term is Note 22431, the Type term is GDT 22433, the Type Name term is Note 22435. The Cardinality between the GDT RevisionQuantityTimeSeries 22400 and the Note 22423 is zero or one 22437.

RevisionQuantityTimeSeries is used for the revision of a QuantityTimeSeries or of a RevisionQuantityTimeSeries itself. In an interface, the data type can have various specifications, depending on the context category used, e.g., "Sales," to describe sales quantities; "Consumption," to describe consumption quantities, and the like.

(hhhhhhhh) ScaleAxisIntervalBoundaryTypeCode

The GDT ScaleAxisIntervalBoundaryTypeCode 22500 is a coded representation of the typing of the discrete values in a scale axis as interval boundaries. An example is: <ScaleAxisIntervalBoundaryTypeCode>2</ScaleAxisIntervalBoundaryTypeCode>.

The structure of GDT Scale Axis Interval Boundary Type Code 22500 is depicted in FIG. 225. For the GDT Scale Axis Interval Boundary Type Code 22500, the Object Class is Scale Axis 22502, the Property is Interval Boundary Type Code 22504, the Representation/Association term is Code 22506, the Type term is CCT 22508, the Type Name term is Code 22510, and the Length is one 22512. The GDT Scale Axis Interval Boundary Type Code 22500 may be a restricted GDT.

An element of type GDT ScaleAxisIntervalBoundaryTypeCode 22500 can have the following illustrative values:

1) The value 1 represents the "lower boundary of an interval" from the current scale axis value to the next highest scale axis value, but excluding the next higher scale axis value; and
2) The value 2 represents the "upper boundary of an interval" to the current scale axis value from the next lowest scale axis value, but excluding the next lower scale axis value.

The scale axis values of a scale may be of the same GDT ScaleAxisIntervalBoundaryTypeCode 22500. It may be possible to arrange the scale axis values of a scale axis uniquely.

The meaning of scale axis values, determined via the ScaleAxisIntervalBoundaryTypeCode, is described as "scale axis type‘ in the context of pricing scales. It is used in this context in the following way. A scale axis is used to determine the "domain" of a (one-dimensional) pricing scale. In this context, the values of the scale axis are described as scale levels. The pricing scale defines a scale rate for each scale level (e.g., net price, or discount). Consequently, a pricing scale comprises the scale levels as "input values" and the scale rates defined for the levels as "output values." The "output values" of a pricing scale are accessed using the scale level(s) to determine conditions in the context of pricing, on values such as, e.g., the order quantity.

A scale level and the scale axis type jointly determine the interval to which the scale rate applies, either 1) from the current scale level up to the next higher level, but excluding the subsequent next level, or 2) up to the current scale level, from the next lowest level, but excluding the next lower level. In the first case, the pricing scale is called the "from-pricing scale," in the second case it is called the "to-pricing scale". Scales axes for pricing scales may explicitly have a minimum and maximum scale axis value.

The scale levels of a pricing scale may be defined in terms of a pricing scale base type. The scale levels for the scale base types quantity, gross value, and number are scale quantity with scale quantity unit, scale rate with scale currency, and scale quantity without unit, respectively. Scale levels are divided into the scale axis of a pricing scale (or the dimension of the pricing scale represented by it). The scale type is valid for all scale levels of a pricing scale, i.e., the different scale levels of a (one-dimensional) pricing scale are always interpreted in the same way as interval boundaries.

The scale levels of a pricing scale may imply disconnected and consuming intervals. For variations of the input value, a scale level (and therefore, the interval implied) is relevant for determining the scale amount when using scale types "lower boundary" and "upper boundary."

The following is an example of a one-dimensional pricing scale of scale type "2" or "upper boundary" with scale base type quantity.

| Scale level as "input value" | | Scale rate with currency, price unit and unit of measure as "output value" |
|---|---|---|
| Scale quantity | Scale unit | |
| 10 | Pieces | 10€/1 piece |
| 100 | Pieces | 9€/1 piece |
| 1000 | Pieces | 8€/1 piece |
| 10000 | Pieces | 8€/1 piece |

When determining a pricing condition for an order quantity of, e.g., 150 pieces, the third scale level is used and the price (150 ST×8 €/1 pc) equal to 1200 € is determined based on the scale type "upper boundary."

The ScaleAxisIntervalBoundaryTypeCode may be a proprietary code list with fixed predefined values. Changes to the permitted values involve changes to the interface. The focus here is on one-dimensional pricing scales, even if multi-dimensional pricing scales can be used for the scale type and possess one scale type per dimension. The same concepts as for pricing conditions are used for scales for free goods and rebate conditions, i.e., the ScaleAxisIntervalBoundaryTypeCode can also be used for these scales. (See also pricing conditions and pricing scales.)

(iiiiiii) ScheduleLineCommitmentCode

The GDT ScheduleLineCommitmentCode 22600 is a coded representation that describes the planning-related meaning of the schedule line information for a purchase order, such as a delivery schedule, and thus determines the (legal) binding nature for the ordered quantity and specified delivery dates for a material/product. An example is: <ScheduleLineCommitmentCode>AE</ScheduleLineCommitmentCode>.

The structure of GDT ScheduleLineCommitmentCode 22600 is depicted in FIG. 226. For the GDT ScheduleLineCommitmentCode 22600, the Object Class is ScheduleLine 22602, the Property is Commitment 22604, the Representation/Association term is Code 22606, the Type term is CCT 22608, the Type term is Code 22610, and the Length is from one to three 22612. The GDT ScheduleLineCommitmentCode 22600 may be a restricted GDT.

The following illustrative values of the ScheduleLineCommitmentCode are in the framework of "scheduling-agreement-based release order":

1) Fixed dates and quantities, which indicates that the schedule line information regarding the specified product quantities and dates is fixed.

2) Production and material go-ahead, which authorizes the vendor to start manufacturing the required products.

3) Material go-ahead, which authorizes the vendor to order the required material for the products to be delivered.

4) Forecast/preview, which represents a non-binding forecast of future purchase orders that currently depend on planned requirements.

5) Shortfall quantity/backlog, which represents a product quantity that has already been ordered but did not arrive by the planned delivery date and therefore may be delivered subsequently.

10) Immediate requirement, which represents an immediately required product quantity that may be included immediately in the next delivery.

The ScheduleLineCommitmentCode refers to the representation UN/EDIFACT 4017: Delivery plan commitment level code. The ScheduleLineCommitmentCode is used to inform a vendor about the binding nature and the meaning of the schedule line information of a release order/forecast delivery schedule. It may be used, for example, in the automotive industry.

(jjjjjjj) ScoreCardID

A GDT ScoreCardID 22700 is the identification of a scorecard. A scorecard is a procedure for assessing a party or subject using different characteristics. An example is: <ScoreCardID>A</ScoreCardID>.

The structure of GDT ScoreCardID 22700 is depicted in FIG. 227. For the GDT ScoreCardID 22700, the Object Class is Score Card 22702, the Property is Identification 22704, the Representation/Association term is Identifier 22706, the Type term is CCT 22708, the Type Name is Identifier 22710, and the Length is from one to twenty 22712. The GDT ScoreCardID 22700 may be a restricted GDT.

The following may apply to 22700:

1) Scorecards are internal to a company and confidential; and

2) The company that specifies the scorecard assigns an ID.

ScoreCardID is unique in the context of the company that specifies the scorecard. Scorecards are used, e.g., by credit agencies to rate companies. In this case, the credit agency assigns the IDs; ScoreCardID is then unique in the context of a credit agency. Another possible use is the company internal identification of a scorecard that is created as part of the "Balanced Scorecard" concept for determining business performance.

(kkkkkkkk) SubContractingIndicator

A GDT SubContractingIndicator 22800 indicates whether the transaction form is subcontracting or not. An example is: <SubContractingIndicator>true</SubContractingIndicator>.

The structure of GDT SubContractingIndicator 22800 is depicted in FIG. 228. The GDT SubcontractingIndicator 22800 is from the core component type Indicator. For the GDT SubContracting Indicator 22800, the Object Class is Sub Contracting 22802, the Property is Indicator 22804, the Representation/Association term is 22806, the Type term is CCT 22808, and the Type Name term is Indicator 22810.

The SubContractingIndicator can have the following illustrative values, either 1) true, meaning that the transaction is subcontracting; or 2) false, meaning that the transaction is not subcontracting. "Subcontracting" is a transaction form in which the vendor receives an order to produce the final product from the delivered materials components.

(llllllll) SubHierarchyDefinitionIndicator

A GDT SubHierarchyDefinitionIndicator 22900 indicates whether something is used to establish a subhierarchy or not. The word "something" as used in this context may generally relate to specific properties or facts. An example is: <Property SubHierarchyDefinitionIndicator>true</PropertySubHierarchyDefinitionIndicator>.

The structure of GDT SubHierarchyDefinitionIndicator 22900 is depicted in FIG. 229. For the GDT SubHierarchyDefinitionIndicator, the Property is SubHierarchyDefinition 22902, the Representation/Association term is Indicator 22904, the Type term is CCT 22906, and the Type Name term is Indicator 22908.

The GDT SubHierarchyDefinitionIndicator 22900 can have the following illustrative values, either 1) true, meaning that something is used to establish a subhierarchy; or 2) false, meaning that something is not used to establish a subhierarchy. (For value range, see CCT:Indicator.)

For each SubHierarchyDefinitionIndicator, there may be defined what is used or not used to define a subhierarchy. This may be reflected in an appropriate name prefix. For example, a PropertySubHierarchyDefinitionIndicator indicates whether a property is used to define a subhierarchy. The SubHierarchyDefinitionIndicator can be used, for example, with a training catalog to indicate which of the properties "Training Contents," "Training Location," "Training Language," and the like, are used to define a subhierarchy of the training offering.

(mmmmmmmm) SubjectAreaCode

The GDT SubjectAreaCode 23000 is a coded representation of a subject area. An example is: <SubjectAreaCode>25.040.40</SubjectAreaCode>. 25.040.40 stands for 'Industrial process measurement and control'; this classifies ISO13584/42, e.g., where the property is defined.

The structure of GDT SubjectAreaCode 23000 is depicted in FIG. 230. For GDT SubjectAreaCode 23000, the Object Class is Subject Area 23002, the Representation/Association term is Code 23004, the Type term is CCT 23006, the Type Name term is DCode 23008, and the Length is nine 23010. The GDT SubjectAreaCode 23000 is a restricted GDT.

The possible illustrative values for the GDT SubjectAreaCode 23000 can be found in the 'International Classification for Standards' (ICS). These standards were created under the overall control of ISO. For explanations and values, see the "World Standards Service Network" at http://www.wssn.net/WSSN/RefDocs/ics2001-en.pdf. For a comprehensive alphabetical index of subject areas, go to http://www.wssn.net/WSSN/RefDocs/ics01index-en.pdf.

GDT SubjectAreaCode 23000 is used for classifying normative documents and standardized objects, and for classifying an object, e.g., a property, into subject areas (nnnnnnnn) TaxJurisdictionCode The GDT TaxJurisdictionCode 23100 is the tax jurisdiction code part of the address. This code is used in various countries and can be derived uniquely from the address. However, it may depend on the code list of the provider. A country can have multiple code-list providers. An example is: <TaxJurisdictionCode listID="VeraZip System," listVersionID="," listAgencyID="Taxware," listAgencySchemeID=","listAgencySchemeAgencyID=""> PA1914101</TaxJurisdictionCode>.

The structure of GDT TaxJurisdictionCode 23100 is depicted in FIG. 231. The GDT TaxJurisdictionCode 23100 includes attributes listID 23116, listVersionID 23136, listAgencyID 23156, listAgencySchemeID 23176, and listAgencySchemeAgencyID 23196. For the GDT TaxJurisdictionCode 23100, the Category is Element 23102, the Object Class is TaxJurisdictionCode 23104, the Property is Tax-JurisdictionCode 23106, the Representation/Association term is Code 23108, the Type term is CCT 23110, the Type Name term is Code 23112, and the Length is from one to fifteen 23114. For the listID 23116, the Category is Attribute 23118, the Object Class is CodeList 23120, the Property is Identification 23122, the Representation/Association term is Identifier 23124, the Type term is xsd 23126, the Type Name term is Token 23128, and the Length is from one to sixty 23130. The Cardinality between the GDT TaxJurisdictionCode 23100 and the listID 23116 is zero or one 23132. The listID 23116 may be optional 23134. For the listVersionID 23136, the Category is Attribute 23138, the Object Class is CodeList 23140, the Property is Version 23142, the Representation/Association term is Identifier 23144, the Type term is xsd 23146, the Type Name term is Token 23148, and the Length is from one to fifteen 23150. The Cardinality between the GDT TaxJurisdictionCode 23100 and the listVersionID 23136 is zero or one 23152. The listVersionID 23136 may be optional 23154. For the listAgencyID 23156, the Category is Attribute 23158, the Object Class is CodeListAgency 23160, the Property is Identification 23162, the Representation/Association term is Identifier 23164, the Type term is xsd 23166, the Type Name term is Token 23188, and the Length is from one to sixty 23170. The Cardinality between the GDT TaxJurisdictionCode 23100 and the listAgencyID 23156 is zero or one 23172. The listAgencyID 23156 may be optional 23174. For the listAgencySchemeID 23176, the Category is Attribute 23178, the Object Class is CodeListAgency 23180, the Property is Scheme 23182, the Representation/Association term is Identifier 23184, the Type term is xsd 23186, the Type Name term is Token 23188, and the Length is from one to sixty 23190. The Cardinality between the GDT TaxJurisdictionCode 23100 and the listAgencySchemeID 23176 is zero or one 23192. The listAgencySchemeID 23176 may be optional 23194. For the listAgencySchemeAgencyID 23196, the Category is Attribute 23198, the Object Class is CodeListAgency 23101, the Property is SchemeAgency 23103, the Representation/Association term is Identifier 23105, the Type term is xsd 23107, the Type Name term is Token 23109, and the Length is three 23111. The Cardinality between the GDT TaxJurisdictionCode 23100 and the listAgencySchemeAgencyID 23196 is zero or one 23113. The listAgencySchemeAgencyID 23196 may be optional 23115.

The GDT TaxJurisdictionCode 23100 specifies the tax jurisdiction code and has a maximum length of 15 characters. The meaning of the attributes listID, listVersionID, listAgencyID, listAgencySchemeID, and listAgencySchemeAgencyID is described in the definition of the CCT Code. For example, in the USA there are many providers of software for calculating taxes that manage TaxJurisdictionCodes. The name of one of these providers is specified in the listAgencyID attribute. The GDT TaxJurisdictionCode 23100 specifies the tax jurisdiction code for a physical address.

(oooooooo) TextSearchableIndicator

A GDT TextSearchableIndicator 23200 indicates whether or not an object is available for text search. A search is performed for a text that is contained either entirely or in part in objects indicated by the indicator. An example is:

<TextSearchableIndicator>true</TextSearchableIndicator>.

The structure of GDT TextSearchIndicator 23200 is depicted in FIG. 232. For the GDT TextSearchIndicator 23200, the Property is Text Searchable 23202, the Representation/Association term is Indicator 23204, the Type term is CCT 23206, and the Type Name term is Indicator 23208.

Valid illustrative values for the 23200 are either: 1) true, meaning that the object is suitable for "text search," or 2) false, meaning that the object is not suitable for "text search."

Both parametric searches and text searches can be possible for an object and one does not preclude the other.

(pppppppp) Time

A GDT Time 23300 represents the time in a 24 hour day. An example is:

<WakeUpTime>08:00:00+01:00</WakeUpTime>.

The structure of GDT Time 23300 is depicted in FIG. 233. For the GDT Time 23300, the Property is Time 23302, the Representation/Association term is DateTime 23304, the Type term is CCT 23306, and the Type Name term is Time 23308.

GDT Time 23300 uses the W3C "built-in data type" xsd: time. This is structured according to the extended representation of ISO 8601 (see http://www.w3.org/TR/NOTE-datetime).

The extended representation is as follows: 1) hh:mm:ss (.sss)Z; or 2) hh:mm:ss(.sss)(±/−)hh:mm. An example for GDT Time 23300 is: 1) 15:30:00Z; or 2) 10:30:00+05:00.

The extended representation for GDT Time 21800 uses the following literals:

1) "hh" for hours, 00-23;
2) "mm" for minutes, 00-59;
3) "ss" for seconds, 00-59;
4) ".sss" where one or more characters after the decimal point represent fractions of a second, where the representation is limited to a maximum of three decimal places, i.e., it is possible to be accurate up to one hundredth of a second;
5) ":" where there may be a colon between the hours, minutes, and seconds;
6) "Z" which may be specified when the represented time is also the UTC time;
7) "+hh:mm" which may be specified when the represented time is a local time that is ahead of UTC time; and
8) "−hh:mm" which may be specified when the represented time is a local time that is behind UTC time.

The following value ranges are defined for GDT Time21800:

1) Time, which represents exactly 24 hours (0-23);
2) Minutes, which represents exactly 60 minutes (0-59);
3) Seconds, which represents exactly 60 seconds (0-59); and
4) Time zone, which is usually expressed in UTC (Coordinated Universal Time). If GDT Time 23300 represents a local time, the time difference with respect to UTC time may be specified.

Time is used to represent a time on any day. Examples of times are wake-up times each day or the time start and end time of a period of time such as the working day or lunch hour.

The time can also be specified without the additional information (Z, +hh:mm, −hh:mm) relating to the coordinated world time (UTC time).

(qqqqqqqq) TimePeriod

A GDT TimePeriod 23400 is a period that is defined by two points in time. These points in time are expressed by a time of day. This time period is determined by a start time and an end time, a start time with a duration, or a duration with an end time. An example is:

```
<WorkingTimePeriod>
    <StartTime>08:00:00</StartTime>
    <EndTime>16:00:00</EndTime>
</WorkingTimePeriod>
```

The structure GDT TimePeriod 23400 is depicted in FIG. 234. The GDT TimePeriod 23400 includes elements StartTime 23406, EndTime 23422, and Duration 23438. For the GDT TimePeriod 23400, the Object Class is Time Period 23402 and the Property is Details 23404.

The GDT TimePeriod 23400 is an aggregation and includes the following sub-elements: 1) StartTime 23406, 2) EndTime 23422, and 3) Duration 23438.

The StartTime 23406 represents the start time in the time period according to the extended representation of ISO 8601. For the StartTime 23406, the Category is Element 23408, the Object Class is Time Period 23410, the Property is Start Time 23412, the Representation/Association term is Time 23414, the Type term is GDT 23416, and the Type Name term is Time 23418. The Cardinality between the GDT TimePeriod 23400 and the StartTime 23406 is zero or one 23420.

The EndTime 23422 represents the end time in the time period according to the extended representation of ISO 8601. For the EndTime 23422, the Category is Element 23424, the Object Class is Time Period 23426, the Property is End Time 23428, the Representation/Association term is Time 23430, the Type term is GDT 23432, and the Type Name term is Time 23434. The Cardinality between the GDT TimePeriod 23400 and the EndTime 23422 is zero or one 23436.

The Duration 23438 may represent the relative duration according to the ISO 8601 convention. The following time conventions may be used: hours (nH), minutes (nM), and seconds (n.nnnS). For the Duration 23438, the Category is Element 23440, the Object Class is Time Period 23442, the Property is Duration 23444, the Representation/Association term is Duration 23446, the Type term is GDT 23448, and the Type Name term is Duration 23450. The Cardinality between the GDT TimePeriod 23400 and the Duration 23438 is zero or one 23452. An example of Duration 23438 is as follow: <Duration>P12H10M13.3S</Duration>.

The GDT TimePeriod 23400 may contain, for example, two different times. The following illustrative combinations are possible: 1) StartTime 23406+EndTime 23422; 2) StartTime 23406+Duration 23438; and 3) EndTime 23422+Duration 23438. StartTime 23406 and EndTime 23422 cannot be more than 24 hours apart. For example, if StartTime 23406 is "18:00" and EndTime 23422 "06:00, " then the value in EndTime automatically refers to the next day.

An example of StartTime 23406 and EndTime 23422 is as follows:

<StartTime>18:00:00</StartTime><EndTime>06:00:00 </EndTime>.

The period of time represented by Duration 23438 can be more than 24 hours. Note that the largest value that can be specified is, for example, hours (nH). In other words, multiple days can be expressed in terms of hours.

An example of Duration 23438 is as follows: <Duration>P76H</Duration>. P76H corresponds to a duration of 3 days and 4 hours.

GDT TimePeriod 23400 can be used to express periods of time in hours, minutes, and seconds. For example, it can define the daily start time and end time for the working day or the start time and duration of a transport.

The value in GTD TimePeriod 23400 is a relative value and is not a day-related representation of a time period that is determined by a time. If the optional reference to coordinated world time (UTC time) is not specified, then the time should be either in the same time zone or implicitly interpreted in the same way by the business partner so as to avoid confusion. The term "Time" in the "Object Class" of the CDT is redundant. Therefore, it consists of the term "Period." This is because the term "Time" is given by the "Property" of the sub-elements. As a result, the semantic of this CDT is unique.

(rrrrrrr) TimeSeries

A GDT TimeSeries 23500 is time series information that consists of items that each contain a period with a start time and an end time, and a period-based quantity or price. An example is:

```
<TimeSeries>
    <Item>
        <ValidityPeriod>
        <StartDateTime>2002-04-19T15:00:00Z</StartDateTime>
        <EndDateTime>2002-04-19T17:00:00Z</EndDateTime>
        </ValidityPeriod>
        <Quantity unitCode="PC" >150</Quantity>
    </Item>
</TimeSeries>.
```

The structure of GTD TimeSeries 23500 is depicted in FIG. 235.

The TimeSeriesItem 23506 is an item in a time series and can be repeated as often as required.

The ValidityPeriod 23518 describes the validity period of the time series item with a start time stamp and an end time stamp.

The Quantity 23534 is of type GDT:Quantity and describes the quantity connected with the time series item.

The Price 23550 describes the price connected with the time series item.

The FixedIndicator 23566 describes whether the corresponding item is blocked for changes or not.

The AdjustmentReasonCode 23582 describes the reason for a change that has been made.

The Note 23596 is a short note for the time series item. This can be a note for the entire time series item or a note for a part of the time series item, e.g., a more detailed explanation of an AdjustmentReasonCode.

For the Integrity Conditions for 23500, a element Quantity or Price may be filled. The TimeSeries 23500 is used as a generic data type that can have various specifications in an interface depending on the context category used, e.g., "Sales," to describe sales quantities; "Consumption," to describe consumption quantities, and the like.

(ssssssss) TimeZoneDifferenceValue

A GDT TimeZoneDifferenceValue 23600 is the difference (in hours) between the local time zone and UTC (Coordinated Universal Time), which is given as a point of reference. An example is: <TimeZoneDifferenceValue>4.5</TimeZoneDifferenceValue>.

The structure of GDT TimeZoneDifferenceValue 23600 is depicted in FIG. 236. For the GDT TimeZoneDifferenceValue 23600, the Property is Time Zone Difference 23602, the Representation/Association term is Value 23604, the Type term is GDT 23606, the Type Name term is DecimalValue 23608, and the Length is two 23610. The GDT TimeZoneDifferenceValue 23600 has, for example, a maximum value of twelve and a minimum value of twelve 23612.

Since the W3C built-in data type "xsd:decimal" is used for TimeZoneDifference, the hours precede the comma and the minutes follow it. Positive values do not need to be prefixed with a positive sign (+). However, negative values may be prefixed with a negative sign (−). The minutes after the comma are expressed in hundredths of a minute. For example, the value "0,5"corresponds to 30 minutes. A facet "xsd:enumeration" is created for each valid time zone value. In this way, values in valid time zones are supported.

TimeZoneDifferenceValue is used to determine the local time zone of the relevant business partner or to determine the current time zone. Minutes are also displayed in the time difference. This is because some countries or regions are divided into half-hour or three-quarters of an hour time zones. For example, Afghanistan (4,5), northern Australia (9,5), southern Australian (10,5), India (5,5), Nepal (5, 75), and the like.

(tttttttt) TotalNumberValue

A GDT TotalNumberValue 23700 is the total number of elements contained in a set. An example is: <TotalNumberValue>20</TotalNumberValue>.

The structure of GDT TotalNumberValue 23700 is depicted in FIG. 237. In an embodiment, non-negative, whole numbers smaller than one billion are permitted (0-999999999) for GDT TotalNumberValue 23700. TotalNumberValue can be used, e.g., to specify the number of objects contained in a list. The structure of GDT TotalNumberValue 23700 is depicted in FIG. 237. For the GDT TotalNumberValue 23700, the Representation/Association Quality term is Total Number 23702, the Representation/Association term is Value 23704, the Type term is xsd 23706, the Type Name term is nonNegativeinteger 23708, and the Length is from one to nine 23710.

(uuuuuuuu) TransmissionID

A GDT TransmissionID 23800 is a unique identifier for a transmission. Transmission is the transfer of information that belongs together by a sequence of (sub) messages. The sequence can comprise a single message. An example is: <TransmissionID>4/7_CatalogXYZ</TransmissionID>.

The structure of GDT TransmissionID 23800 is depicted in FIG. 238.

GDT TransmissionID 23800 is a string with a maximum of forty characters. The following illustrative values are permitted: 1) Upper case letters from A to Z (without German umlauts); 2) Digits from 0 to 9; 3) – (minus sign); 4) _(underscore); 5) / (forward slash); 6) \ (back slash); and 7) . (period). It may be ensured that the sender and receiver use the same GDT TransmissionID 23800 once in the communication. The structure of GDT TransmissionID 23800 is depicted in FIG. 238. For the GDT TransmissionID 23800, the Object Class is Transmission 23802, the Property is Identification 23804, the Representation/Association term is Identifier 23806, the Type term is CCT 23808, the Type Name term is Identifier 23810, and the Length is from one to forty 23812. The GDT TransmissionID 23800 may be a restricted GDT.

GDT TransmissionID 22300 is used to transfer objects that can be divided up and sent in multiple messages due to their large size. GDT TransmissionID can be used in such cases in the following illustrative messages: 1) In the (sub) messages, which actually transmit the object, to identify uniquely a sequence of (sub) messages that belong together; 2) In messages that confirm the receipt and processing of individual (sub) messages; 3) In messages that confirm the receipt and processing of the complete sequence of (sub) messages and therefore of the complete object; and 4) In messages that display the cancellation of the transmission.

(vvvvvvvv) TransportMeans

A GDT TransportMeans 23900 is the description of a means of transport and can also include information for a more detailed identification. An example is:

```
<TransportMeans>
    <ID>HD - ES 1234</ID>
    <DescriptionCode>31</DescriptionCode>
</TransportMeans>.
```

The structure of GDT TransportMeans 23900 is depicted in FIG. 239. GDT TransportMeans 23900 is composed of the two sub-elements TransportMeansID 23908 and Transport- MeansDescriptionCode 23928 from the Global Data Type TransportMeansDescriptionCode 23928. The GDT TransportMeans 23900 includes elements ID 23908 and DescriptionCode 23928. For the GDT TransportMeans 23900, the Object Class is Transport-Means 23902, the Property is Details 23904, and the Representation/Association term is Details 23906.

The TransportMeansID 23908 is used to identify the means of transport. The TransportMeansID 23908 can be, e.g., a license number for a truck or the identification number of a container. For the ID 23908, the Category is Element 23910, the Object Class is Transport-Means 23912, the Property is Identification 23914, the Representation/Association term is Identifier 23916, the Type term is CCT 23918, the Type Name term is Identifier 23920, and the Length is from one to twenty 23922. The Cardinality between the GDT TransportMeans 23900 and the ID 23908 is zero or one 23924. The ID 23908 may be restricted.

The TransportMeansDescriptionCode 23928 is a coded representation of the transport means description (see also GDT:TransportMeansDescriptionCode). For the DescriptionCode 23928, the Category is Element 23930, the Object Class is Transport-Means 23932, the Property is Description 23934, the Representation/Association term is Code 23936, the Type term is GDT 23938, and the Type Name term is TransportMeansDescriptionCode 23940. The Cardinality between the GDT TransportMeans 23900 and the DescriptionCode 23928 is one 23942.

The TransportMeansID 23908 can have a maximum of 20 characters, taking into account the restrictions defined in the xsd:token. The TransportMeansID 23908 refers to the transport means description specified using the TransportMeansDescriptionCode 23928. For the Integrity Conditions for TransportMeansDescriptionCode 23928, see its documentation.

The GDT:TransportMeans 23900 is used within the shipping notification to provide a goods recipient the description and exact identification of the means of transport with which the goods are delivered. The TransportMeansID 23908 corresponds to the "Means of transport ID" (TRAID) used in the R/3 in the IDOC DELVRY03. The TransportMeansDescriptionCode 23928 corresponds with the "Means of Transport Type" (TRATY) used in the R/3 in the IDOC DELVRY03.

(wwwwwwww) TransportMeansDescriptionCode

The GDT TransportMeansDescriptionCode 24000 is a coded representation of the transport means type with which goods or persons are to be transported (e.g., road tanker, barge, airplane, or refrigerated road tanker.) An example is:

```
<TransportMeansDescriptionCode>
      1
<TransportMeansDescriptionCode>.
```

Transportation per barge with equipment for loading and transportation of liquid chemicals.

The structure of GDT TransportMeansDescriptionCode 24000 is depicted in FIG. 240. The GDT TransportMeansDescriptionCode 24000 is of the CoreComponentType "Code." For the GDT TransportMeansDescriptionCode 24000, the Object Class is TransportMeans 24002, the Property is Description 24004, the Representation/Association term is Code 24006, the Type term is CCT 24008, the Type Name term is Code 24010, and the Length is from one to four 24012. The GDT TransportMeansDescriptionCode 24000 may be a restricted GDT.

According to the UN/EDIFACT: Data Element 8179 is the "Transport means description code" allowing up to 8 alphanumeric characters. The Code Values for the 24000 (as copied from UN/EDIFACT) are as follows:

1) 1 Barge chemical tanker—A barge equipped to transport liquid chemicals;

2) 2 Coaster chemical tanker—A coaster vessel equipped to transport liquid chemicals;

3) 3 Dry bulk carrier—Vessel designed to carry dry bulk (expellers);

4) 4 Deep sea chemical tanker—An ocean-going vessel equipped to transport liquid chemicals;

5) 5 Gas tanker—A vessel equipped to transport gas;

6) 6 Aircraft—A machine capable of flight;

7) 7 Car with caravan—A caravan towed by a car;

8) 8 Container ship—Vessel capable of carrying containers and other cargo;

9) 9 Exceptional transport—Transport for which common characteristics are not applicable (e.g. big transformers requiring special wagons, special tackles, special routing and the like.);

10) 10 Bus—To specify that the means of transportation is a bus;

11)11 Ship—A large vessel navigating deep water;

12) 12 Ship tanker—A large vessel equipped to transport liquids;

13) 13 Ocean vessel—An ocean-going vessel that is not a ship;

14) 14 Flatbed trailer—A means of transport identification code indicating a flatbed trailer;

Note:

1. This code value will be removed effective with directory D.02B;

15) 15 Taxi—A means of transport identification code indicating a taxi;

16) 16 Barge—A category of boat used to transport material over water;

17) 17 Customer determined means of transport—The type of means of transport is to be determined by the customer;

18) 18 Seller determined means of transport—The type of means of transport is to be determined by the seller;

19) 19 Tip-up truck—A truck capable of tipping up in order to deliver its load;

20) 20 Furniture truck—A truck used explicitly for the conveyance of furniture;

21) 21 Rail tanker—A rail wagon equipped to transport liquids;

22) 22 Rail silo tanker—Self explanatory;

Note:

1. This code value will be removed effective with directory D.04B;

23) 23 Rail bulk car—A rail wagon equipped to transport bulk cargo;

24) 24 Customer rail tanker—A customer-owned rail wagon equipped to transport liquids;

25) 25 Rail express—Description to be provided;

Note:

1. This code value will be removed effective with directory D.04B;

26) 26 Tip-up articulated truck—An articulated truck capable of tipping up in order to deliver its load;

27) 27 Rigid truck with tank—A rigid truck fitted with a tank capable of carrying liquids or bulk goods;

28) 28 Refrigerated truck and trailer—A combined truck and trailer equipped to maintain refrigerated temperatures;

29) 29 Freezer truck and trailer—A combined truck and trailer equipped to maintain freezing temperatures;

30) 30 Tautliner 25 ton, combined with 90 cubic meter trailer with removable roof—A truck with non-ridged sides, 25 ton capacity combined with a 90 cubic meter trailer with removable roof;

31) 31 Truck—An automotive vehicle for hauling goods;

32) 32 Road tanker—An over-the-road tank trucker or trailer;

33) 33 Road silo tanker—Description to be provided;

Note:

1. This code value will be removed effective with directory D.04B;

34) 34 Tautliner truck—A truck with non-ridged sides;

35) 35 Truck/trailer with tilt—A truck and trailer combination with a tilting capability;

36) 36 Pipeline—A line of pipes for conveying water, gas, oil, and the like.;

37) 37 Hydrant cart—Vehicle used at large airports with installed distribution systems to make into-plane deliveries of fuel; distinguished from other types of fuelling vehicles;

38) 38 Car—Car;

39) 39 Tautliner truck with removable roof—A truck with non-ridged sides and removable roof;

40) 40 Truck with opening floor—A truck with an opening floor mechanism which is used to discharge the cargo;

41) 41 Freezer truck—A truck equipped to maintain freezing temperatures;

42) 42 Isothermic truck—A truck equipped to maintain controlled temperatures;

43) 43 Refrigerated truck—A truck equipped to maintain refrigerated temperatures;

44) 44 Freezer van—A small rigid covered vehicle for conveying frozen goods;

45) 45 Isothermic van—A small rigid covered vehicle for conveying temperature controlled goods;

46) 46 Refrigerated van—A small rigid covered vehicle for conveying refrigerated goods;

47) 47 Bulk truck—A truck suitable for transporting bulk goods;

48) 48 Van—A small vehicle suitable for carrying small volume loads;

49) 49 Roadrailer—Used for shipments that travel by multimodal rail or highway trailer (roadrailer);

50) 50 Passenger vessel—Vessel for carrying passengers;

51) 51 Cargo and passenger vessel—Vessel for carrying cargo and passengers;

52) 52 General cargo vessel—Vessel for carrying general cargo;

53) 53 Crude oil tanker—Vessel for carrying crude oil;

54) 54 Liquefied Petroleum Gas (LPG) carrier—Vessel for carrying Liquefied Petroleum Gas (LPG);

55) 55 Liquefied Natural Gas (LNG) carrier—Vessel for carrying Liquefied Natural Gas (LNG);

56) 56 Grain carrier—Vessel for carrying grain;

57) 57 Timber or log carrier—Vessel for carrying timber or logs;

58) 58 Wood chip carrier—Vessel for carrying wood chips;

59) 59 Steel products vessel—Vessel for carrying steel products;

60) 60 Gravel vessel—Vessel for carrying gravel;

61) 61 Cement vessel—Vessel for carrying cement in bulk;

62) 62 Coal vessel—Vessel for carrying coal;

63) 63 Ore carrier—Vessel for carrying ore in bulk;

64) 64 Car carrier—Vessel for carrying complete cars and/or their knock- down parts;

65) 65 Container only vessel—Vessel for carrying containers only;

66) 66 Roll on-roll off vessel—A vessel capable of carrying roll on-roll off cargo;

67) 67 Ferry—A means of transport for carrying passengers and/or vehicles on a regular basis;

68) 68 Fishing vessel—Vessel used in the catching of fish;

69) 69 Work vessel; A vessel engaged in "port and harbor work," which means construction, improvement, maintenance or rehabilitation of port and harbor facilities. Dredger, floating crane, sand carrier with grab bucket are included in this type of the means of transport.

70) 70 Patrol vessel—A vessel to patrol port or coastal area;

71) 71 Tug and/or push boat—A vessel to push and/or pull other vessels;

72) 72 Train with one wagon—A train with a single wagon used to carry goods;

73) 73 Train with more than one and less than 20 wagons—A train with more than one and less than 20 wagons used to carry goods;

74) 74 Train with 20 or more wagons—A train with 20 or more wagons used to carry goods;

75) 75 Oil products tanker—A vessel for carrying products derived from crude oil;

76) 76 Training vessel—A vessel for learning maritime skills;

77) 77 Freezer truck and isothermic trailer—A combined freezer truck and isothermic trailer;

78) 78 Isothermic truck and isothermic trailer—A truck and a trailer equipped to maintain controlled temperatures;

79) 79 Refrigerated truck and isothermic trailer—A combined refrigerated truck and isothermic trailer;

80) 80 Freezer truck and refrigerated trailer—A combined freezer truck and refrigerated trailer;

81) 81 Isothermic truck and refrigerated trailer—A combined isothernic truck and refrigerated trailer;

82) 82 Rigid truck with tank and tank trailer—A combined rigid truck with tank and tank trailer;

83) 83 Bulk truck and tank trailer—A combined truck capable of carrying liquids or bulk goods and a tank trailer;

84) 84 Rigid truck with tank and bulk trailer—A combined rigid truck with tank and a trailer capable of carrying liquids or bulk goods;

85) 85 Bulk truck and bulk trailer—A combined truck and a trailer both capable of carrying liquids or bulk goods;

86) 86 Tautliner truck and extendable trailer—A combined tautliner truck and extendable trailer;

87) 87 Tautliner truck with removable roof and extendable trailer—A combined tautliner truck with removable roof and extendable trailer; 88) 88 Truck with opening floor and extendable trailer—A combined truck with opening floor and extendable trailer;

89) 89 Bulk truck and extendable trailer—A combined truck capable of carrying liquids or bulk goods and an extendable trailer;

90) 90 Isothermic truck and freezer trailer—A combined isothermic truck and freezer trailer;

91) 91 Refrigerated truck and freezer trailer—A combined refrigerated truck and freezer trailer;

92) 92 Tip-up truck and gondola trailer—A combined tip-up truck and gondola trailer. A gondola trailer is a split level trailer suitable for the transport of heavy machinery;

93) 93 Tautliner truck and gondola trailer—A combined tautliner truck and gondola trailer. A gondola trailer is a split level trailer suitable for the transport of heavy machinery;

94) 94 Tautliner truck with removable roof and gondola trailer—A combined tautliner truck with removable roof and gondola trailer. A gondola trailer is a split level trailer suitable for the transport of heavy machinery;

95) 95 Truck with opening floor and gondola trailer—A combined truck with opening floor and gondola trailer. A gondola trailer is a split level trailer suitable for the transport of heavy machinery;

96) 96 Bulk truck and gondola trailer—A combined truck capable of carrying liquids or bulk goods and a gondola trailer. A gondola trailer is a split level trailer suitable for the transport of heavy machinery;

97) 97 Tip-up truck and extendable gondola trailer—A combined tip-up truck with extendable gondola trailer. An extendable gondola trailer is a trailer fitted with a rear axle which can be extended to cater for variable length and is suitable for the transport of heavy machinery;

98) 98 Tautliner truck and extendable gondola trailer—A combined tautliner truck and extendable gondola trailer. An extendable gondola trailer is a trailer fitted with a rear axle that can be extended to cater for variable length and is suitable for the transport of heavy machinery;

99) 99 Tautliner truck with removable roof and extendable gondolatrailer—A combined tautliner truck with removable roof and extendable gondola trailer. An extendable gondola trailer is a trailer fitted with a rear axle that can be extended to cater for variable length and is suitable for the transport of heavy machinery;

100) 100 Truck with opening floor and extendable gondola trailer—A combined truck with opening floor and extendable gondola trailer. An extendable gondola trailer is a trailer fitted with a rear axle that can be extended to cater for variable length and is suitable for the transport of heavy machinery;

101) 101 Bulk truck and extendable gondola trailer—A combined truck capable of carrying liquids or bulk goods and a extendable gondola trailer. An extendable gondola trailer is a trailer fitted with a rear axle that can be extended to cater for variable length and is suitable for the transport of heavy machinery;

102) 102 Tip-up truck and trailer with opening floor—A combined tip-up truck and trailer with opening floor;

103) 103 Tautliner truck and trailer with opening floor—A combined tautliner truck and trailer with opening floor;

104) 104 Tautliner truck with removable roof and trailer with opening floor—A combined tautliner truck with removable roof and trailer with opening floor;

105) 105 Truck and trailer with opening floor—A combined truck and a trailer with an opening floor;

106) 106 Bulk truck and trailer with opening floor—A combined truck capable of carrying liquids or bulk goods and a trailer with opening floor;

107) 107 Removal truck and trailer—A combined truck and trailer capable of carrying household effects;

108) 108 Tautliner truck and removal trailer—A combined tautliner truck and trailer capable of carrying household effects;

109) 109 Tautliner truck with removable roof and removal trailer—A combined tautliner truck with a removable roof and a trailer capable of carrying household effects; and 110) 110 Vessel, temperature controlled cargo—A vessel to carry temperature controlled cargo.

The TransportMeansDescriptionCode is used to determine concrete means of transportation. (See R/3: Means-of-Transport Type: CHAR 4).

(xxxxxxxx) TransportModeCode

The GDT TransportModeCode 24100 is a coded representation of the mode of transportation used for delivery. An example is:

```
<TransportModeCode>
    1
<\TransportModeCode>
```

Conveyance per transportation by sea

The structure of GDT TransportModeCode 24100 is depicted in FIG. 241. For the GDT TransportModeCode 24100, the Object Class is Transport Mode 24102, the Property is Code 24104, the Representation/Association term is Code 24106, the Type term is CCT 24108, the Type Name term is Code 24110, and the Length is from one to two 24112. The GDT TransportModeCode 24100 may be a restricted GDT.

See UN/EDIFACT: Data Element 8067 ("Transport mode name code"): an . . . 3 (up to 3 alpha-numeric characters), Code values as UN/EDIFACT Recommendation 19 ("Code for Modes of Transport").

This code list can be represented in a 2-character field. Therefore, the field is defined here as a 2-character field using the corresponding R/3 applications to avoid mapping problems.

The GDT TranportModeCode 24100 can contain codes that are included in the following code list.

| | |
|---|---|
| 0 | Transport mode not specified<br>Transport mode has not been specified<br>Notes:<br>1) This code can be used when the mode is not known or when information on it is not available at the time of issuing the document concerned. |
| 1 | Maritime transport<br>Transport of goods and/or persons is by sea. |
| 2 | Rail transport<br>Transport of goods and/or persons is by rail. |
| 3 | Road transport<br>Transport of goods and/or persons is by sea. |
| 4 | Air transport<br>Transport of goods and/or persons is by air. |
| 5 | Mail<br>Method to convey goods is by mail<br>Notes:<br>1) This code is provided for practical reasons, despite the fact that mail is not a genuine mode of transport. In many countries, the value of merchandise exported and imported by mail is considerable, but the exporter or importer concerned would be unable to state by which mode postal items had been conveyed. |

-continued

| | |
|---|---|
| 6 | Multimodal transport<br>Method to convey goods and/or persons is by multimodal transport.<br>Notes:<br>1) This code is provided for practical reasons, despite the fact that multimodal transport is not a genuine mode of transport. It can be used when goods are carried by at least two different modes from a place at which the goods are taken in charge by a transport operator to a place designated for delivery, on the basis of one transport contract. (Operations of pick-up and delivery of goods carried out in the performance of a single mode of transport, as defined in such a contract, shall not be considered as multimodal transport). |
| 7 | Fixed transport installation<br>Transport of item is via a fixed transport installation.<br>Notes:<br>1) This code applies to installations for continuous transport such as pipelines, ropeways and electric power lines. |
| 8 | Inland water transport<br>Transport of goods and/or persons is by inland water. |
| 9 | Transport mode not applicable<br>The mode of transport is not applicable. |

With the specification of the TransportMode, other conditions are usually linked in the general business conditions that are implicitly agreed upon/defined by specifying a TransportMode (e.g., price, time during which delivery can be made, or any service agent. The TransportModeCode acts for the executing partner/vendor as a criterion for grouping deliveries into transports and for route determination in R/3, for example. Furthermore, it is the basis for determining concrete transportation routes, means of transport, and responsible organization units (e.g., materials planning point). The TransportMode "MaritimeTransport" implies a sea route and the necessity of customs/port procedures, for example. These specifications may also be required for contractual reasons. In many countries, they are required for customs clearance and statistical purposes.

The 24100 illustratively corresponds to R/3: Shipping Type: CHAR 2. The GDT TranportModeCode 24100 is included in the ordered service. It may not define any concrete route or means of transportation.

(yyyyyyyy) TransportServiceLevelCode

The GDT TransportServiceLevelCode 24200 is a coded representation of the agreed/defined services in terms of the delivery of goods with respect to the speed of the delivery (as part of the ordered service). An example or instance is:

<TransportServiceLevelCode>01<TransportServiceLevelCode>.

Customer wants express transportation and accepts the associated increased cost of transport. Delivery made in 24 hours by the latest."The structure of GDT TransportServiceLevelCode 24200 is depicted in FIG. 242. For the GDT TransportServiceLevelCode 24200, the Object Class is Transport 24202, the Property is ServiceLevelCode 24204, the Representation/Association term is Code 24206, the Type term is CCT 24208, the Type Name term is Code 24210, and the Length is from one to two 24212. The GDT TransportServiceLevelCode 24200 may be a restricted GDT. (Comment: Length 2 using the analogous field in R/3)

The GDT TransportServiceLevelCode 24200 is represented by a 2-character string and can include codes from the following code list:. (UN/EDIFACT: Data Element 4219 ("Transport service priority code"): an . . . 3 (up to 3 alphanumeric characters) BUT). This code list can be represented in a 2-character field. Therefore, the field is defined here as a 2-character field in accordance with the corresponding R/3 applications to avoid mapping problems. The code list includes the following codes:

1) 1—Express which is for express treatment (if by rail, legal express regime for parcels transport).
2) 2—High speed which is for transport under legal international rail convention (CIM) concluded between rail organizations and based on fast routing and specified timetables.
3) 3—Normal speed which is for Transport under legal international rail convention (CIM) concluded between rail organizations.
4) 4—Post service which is for Transport under conditions specified by UPU (Universal Postal Union) and Rail organizations (parcels transport only).

With the specification of the GDT TranportServiceLevelCode 24200, other conditions may be linked in the general business conditions that are implicitly agreed on/defined by specifying a TransporServiceLevel (e.g., price, guaranteed time during which delivery may be made, any agent, entitlements in case of non-compliance).

The buyer and seller/service agent use the GDT TransportServiceLevelCode 24200 to agree on the modalities to be used for delivery and the buyer accepts the corresponding conditions.

Using this specification, the seller can determine (depending on the business process) the internal shipping point to be used for this delivery, which service agent is to be used under what conditions, and the like.

In the framework of this agreement, the service agent/seller guarantees the customer a maximum period (e.g., 24 hours) within which delivery is to be made, and the like. If these conditions are breached, liability claims against the seller may arise.

In R/3, a TransportServiceLevelCode is assigned either to a sales document type or to a sold-to party.

Depending on the specified TransportServiceLevelCode (along with loading group and plant), a suitable shipping point can be determined that is responsible for the corresponding process.

Along with the country and the geographic zone of the shipping point, the ship-to party and the transportation group, a suitable route can be determined. (The same applies to deliveries—the geography of the seller and the goods receiving point determines the transportation group and shipping conditions.)

The 24200 may correspond to R/3: Shipping Condition: CHAR 2. The difference between PriorityCode and TransportServiceLevelCode is that when using the PriorityCode an urgency, from the buyer's perspective, is assigned to an object (e.g., an item) in terms of delivery, e.g., from which a ServiceLevel may be derived within the business process at the seller. When specifying a TransportServiceLevel, a business agreement with the partner occurs. For example, when the buyer gives his seller a priority. Seller agrees on a Service Level with his transportation service provider according to buyer's priority.

(zzzzzzzz) TransportTracking

A GDT TransportTracking 24300 contains transport-related information that can be used for tracking deliveries, e.g., in the framework of goods deliveries. An example or instance is:

```
<TransportTracking>
<ID>4711</ID>
    <WebAddress>http://www.mayerexpressdienst.com/
TrackingHomePage.htm</WebAddress>
</TransportTracking>.
```

The structure of GDT TransportTracking 24300 is depicted in FIG. 243. The GDT TransportTracking 24300 includes elements ID 24308 and WebAddress 24326. For the GDT TransportTracking 24300, the Object Class is TransportTracking 24302, the Property is Details 24304, and the Representation/Association term is Details 24306.

The GDT TransportTrackingID 24308 is a unique identifier of a shipment, for example, a package or a container. For the ID 24308, the Category is Element 24310, the Object Class is TransportTracking 24312, the Property is Identification 24314, the Representation/Association term is Identifier 24316, the Type term is CCT 24318, the Type Name term is Identifier 24320, and the Length is from one to thirty-five 24322. The Cardinality between the GDT TransportTracking 24300 and the ID 24308 is one 24323. The ID 24308 may be restricted 24324. The TransportTrackingWebAddress 24326 specifies an address in the World Wide Web that can be used to track delivery with the TransportTrackingID. For the WebAddress 24326, the Category is Element 24328, the Object Class is TransportTracking 24330, the Property is WebAddress 24332, the Representation/Association term is ElectronicAddress 24334, the Type term is GDT 24336, and the Type Name term is WebAddress 24338. The Cardinality between the GDT TransportTracking 24300 and the WebAddress 24326 is zero or one 24340.

If a courier, express, and package service provider is responsible for the goods delivery, it may determine the format of the TransportTrackingID. The TransportTrackingWebAddress includes, e.g., the homepage of the supplier of the delivery tracking service.

The TransportTrackingID can have a maximum of 35 characters, taking into account the restrictions defined in the xsd:token. The TransportTrackingID is unique in connection with the business partner providing the delivery tracking service. The identification of the business partner is carried out as context information in the message. It can also take place using the TransportTrackingWebAddress.

The TransportTrackingWebAddress can include every URI (see also the definition of GDT:WebAddress) and can have a maximum 255-character string.

The GDT TransportTracking is used in the framework of the shipping notification to provide a goods recipient an identification and an Internet address for the online delivery tracking of the current delivered goods. The TransportTrackingID corresponds to the Tracking Number (TRACKN) used in the R/3 in the IDOC DELVRY03. The TransportTrackingWebAddress may correspond to the "URL for Forwarding Agent" (XSIURL_MULTI_TRACK) used in the R/3 in the IDOC DELVRY03.

(aaaaaaaaa) TupleLengthValue

A GDT TupleLengthValue 24400 is the number of entries in a tuple. A tuple is a linear set with a fixed number of elements. The elements of a tuple are also referred to as entries and can be of different types. An example is: <TupleLengthValue>7</TupleLengthValue>.

The structure of GDT TupleLengthValue 24400 is depicted in FIG. 244. For the GDT TupleLengthValue 24400, the Represenation/Association Quality term is Tuple Length 24402, the Representation/Association term is Value 24404, the Type term is xsd 24406, the Type Name term is nonNegativeInteger 24408, and the Length is from one to two 24410.

The GDT TupleLengthValue 24400 is a qualified basic GDT based on the secondary Representation/Association Value of the CCT Numeric and a restriction of xsd:decimal. In an embodiment, non-negative whole numbers less than one hundred are permitted. The tuple length indicates whether a tuple is a pair (length=2), triple (length=3), quadruple (length=4), quintuple (length=5), and the like. Tuple lengths greater than 3 are usually referred to as 4-tuples, 5-tuples, and so on (or generally as n-tuples). A list differs from a tuple in that its length is flexible. An array is different from a tuple in that its elements can be indexed and in that it can have a higher dimension (2-dimensional arrays, 3-dimensional arrays, and the like). Furthermore, the entries in a list and the elements in an array are usually of the same type. A vector is a special instance of a one-dimensional array that is subject to additional mathematical rules (such as, e.g., vector addition).

(bbbbbbbbb) UnplannedItemPermissionCode

The GDT UnplannedItemPermissionCode 24500 is a coded representation of the permission to enter additional, unplanned items in a business follow-up document. An example is: <UnplannedItemPermissionCode>01 </UnplannedItemPermissionCode>.

The structure of GDT Unplanned Item Permission Code 24500 is depicted in FIG. 245. For the GDT Unplanned Item Permission Code 24500, the Object Class is Unplanned Item 24502, the Property is Permission Code 24504, the Representation/Association term is Code 24506, the Type term is CCT 24508, the Type Name term is Code 24510, and the Length is two 24512. The GDT Unplanned Item Permission Code 24500 may be a restricted GDT.

UnplannedItemPermissionCode can have the following illustrative values: 1) "01" which means NotAllowed. In follow-up documents, unplanned items are not allowed to refer to an item indicated in this way. 2) "02" which means WithContractReferenceOnly. In follow-up documents, unplanned items with a contract reference are allowed to refer to an item indicated in this way. 3) "03" which means Allowed. In follow-up documents, unplanned items are allowed to refer to an item indicated in this way.

The GDT UnplannedItemPermissionCode 24500 is used to show business partners whether or not they are allowed to enter additional items for an item in a document in a subsequent process. For example, in a purchase order, the buyer informs the seller whether or not it can specify additional unplanned items for a purchase order item in the invoice. This is useful if the requirements are unknown at the time of ordering. This can be the case for repairs, where the spare parts required are not known until the repair has been made. The GDT UnplannedItemPermissionCode 24500 may be a proprietary code list with fixed predefined values. Changes to the permitted values may involve changes to the interface.

(ccccccccc) ValueDifferenceIndicator

A GDT ValueDifferenceIndicator 24600 indicates whether or not a value-related difference exists. An example is: <ValueDifferenceIndicator>true</ValueDifferenceIndicator>.

The structure of GDT ValueDifferenceIndicator 24600 is depicted in FIG. 246. For the GDT ValueDifferenceIndicator 24600, the Property is ValueDifference 24602, the Representation/Association term is Indicator 24604, the Type term is CCT 24606, and the Type Name term is Indicator 246808.

The GDT ValueDifferenceIndicator 24600 can have the following illustrative values: 1) true, which means the difference is value-related; or 2) false, which means the difference is not value-related. (See CCT:Indicator for value range).

Each ValueDifferenceIndicator may refer to a business object or to a list of similar business objects. This relationship is reflected in a corresponding refinement of the "value" name prefix. This name prefix is omitted when actually used in tag names. For example, an AmountDifferenceIndicator is the specification of whether there is a value-related difference for a money amount. Other possible forms are QuantityDifferenceIndicator, MeasureDifferenceIndicator, and PriceDifferenceIndicator.

The ValueDifferenceIndicator can be used to display whether the current value is specified for a business variable or the difference to an earlier value. Another possible use is the specification of whether it is an actual or a target value or the difference between the two. In the context of an interface, the business meaning of the values for the ValueDifferenceindicator may be described in addition to the name prefix (see Integrity Conditions) being specified.

(dddddddd) ValueUnlimitedIndicator

A GDT ValueUnlimitedIndicator 24700 indicates whether a value is unlimited or not. An example is: <ValueUnlimitedIndicator>true</ValueUnlimitedIndicator>.

The structure of GDT Value Unlimited Indicator 24700 is depicted in FIG. 247. For the GDT Value Unlimited Indicator 24700, the Object Class is Value 24702, the Property is Unlimited Indicator 24704, the Representation/Association term is Indicator 24706, the Type term is CCT 24708, and the Type Name term is Indicator 24710.

The ValueUnlimitedindicator can have the following illustrative values: 1) true, which means a value is unlimited; or 2) false, which means a value is not unlimited. (See CCT Indicator for value range).

The default for a ValueUnlimitedIndicator may be 'false' so that when ValueUnlimitedindicator is not present it is equal to a ValueUnlimitedIndicator with the value 'false'. If a ValueUnlimitedIndicator has the value 'true', then the corresponding numerical element may be nonexistent, empty or initial. A ValueUnlimitedIndicator is used with reference to a numerical element if this element can have values that are unlimited in size. The reference to a particular element may be apparent when using ValueUnlimitedIndicator. The relationship to a numerical element is reflected in a corresponding refinement of the "value" name prefix. This name prefix is omitted when actually used in tag names. A good example of the use of the ValueUnlimitedIndicator is the QuantityTolerance GDT. The ValueUnlimitedIndicator is used in this GDT to display any size tolerance.

(eeeeeeeee) VersionID

A GDT VersionID 24800 is a unique identifier for a version. A version is a differentiation of objects of an object type in accordance with the sequence in which they were created. An example is: <VersionID>1.1.5</VersionID>.

The structure of GDT VersionID 24800 is depicted in FIG. 248. For the GDT VersionID 24800, the Category is Element 24802, the Object Class is Version 24804, the Property is Identification 24806, the Representation/Association term is Identifier 24808, the Type term is CCT 24810, the Type Name term is Identifier 24812, and the Length is from one to thirty-two 24814. The GDT VersionID 24800 may be a restricted GDT.

Versions can be differentiated using the criteria before-after. They are sorted "in turn." A version can be referenced directly externally by specifying the object and its GDT VersionID 23300. It has the following characteristics: 1) It describes different characteristics of an object for external users; 2) It represents a significant change compared to other versions from a user perspective; 3) It is independent and self-contained, i.e., changes to one version do not affect other versions; 4) Versions can be developed further in parallel; and 5) The format of the version is up to the application in which the object is located. Examples are X.Y.Z or a time stamp. A variant is the differentiation of objects of an object type at the same point in time.

(fffffffff) VisibleIndicator

A GDT VisibleIndicator 24900 indicates whether something is visible or not. The word "something" generally stands for specific characters, documents, properties, or facts. An example is: <PropertyVisibleIndicator>true</PropertyVisibleIndicator>.

The structure of GDT VisibleIndicator 24900 is depicted in FIG. 249. For the GDT VisibleIndicator 24900, the Property is Visible 24902, the Representation/Association term is Indicator 24904, the Type term is CCT 24906, and the Type Name term is Indicator 24908.

The GDT VisibleIndicator 24900 can have the following values: 1) true, which means something is visible; or 2) false, which means something is not visible. (For value range, see CCT:Indicator)

For each GDT VisibleIndicator24900, there may be specified what is visible or not visible. This is reflected in an appropriate name prefix. For example, a PropertyVisibleIndicator indicates whether a property is visible or not. The GDT VisibleIndicator 24900 can be used, e.g., to indicate whether certain properties of a product are to be visible to a customer. In the context of an interface, the business significance of "what is visible" may be described in greater detail for the GDT VisibleIndicator 24900 in addition to its name prefix (see Integrity Conditions).

(ggggggggg) WebAddress

A GDT WebAddress 25000 is a unique digital address for a document that is available on the World Wide Web. The document contains information required by the user and is based on hypertext technology. An example is:

```
<WebAddress>
        http://www.sap.com/GlobalDataTypes.htm
</WebAddress>
```

The structure of GDT Web Address 25000 is depicted in FIG. 250. The GDT Web Address 25000 includes attribute language Code 25016. For the GDT Web Address 25000, the Object Class is WebAddress 25002, the Property is Address 25004, the Representation/Association term is Electronic Address 13506, the Type term is CCT 25008, the Type Name term is Electronic Address 25010, and the Length is from one to two-hundred fifty-five 25012.

The syntax of the built-in data type "xsd:anyURI" is defined in the IETF RFC 2396 recommendation. For more details, see the "SAP Core Component Types" specification document.

The following URI schemes can be used from the list of available URI schemes (see also Uniform Resource Identifier (URI) Schemes):

| Scheme Name | Description | Reference |
|---|---|---|
| ftp | File Transfer Protocol | [IETF RFC 1738] |
| http | Hypertext Transfer Protocol | [IETF RFC 2616] |
| Gopher | The Gopher Protocol | [IETF RFC 1738] |
| News | USENET news | [IETF RFC 1738] |

-continued

| Scheme Name | Description | Reference |
|---|---|---|
| nntp | USENET news using NNTP access | [IETF RFC 1738] |
| wais | Wide Area Information Servers | [IETF RFC 1738] |
| File | Host-specific file names | [IETF RFC 1738] |
| prospero | Prospero Directory Service | [IETF RFC 1738] |
| Service | service location | [IETF RFC 2609] |
| Nfs | network file system protocol | [IETF RFC 2224] |
| https | Hypertext Transfer Protocol Secure | [IETF RFC 2818] |

The following attribute can be used for the GDT WebAddress 25000:

languageCode, which defines the language of the hypertext contents in accordance with the RFC 3066 recommendation. The language code can also be included if a translation service is to be automatically triggered at the receiver. For the language Code 25016, the Category is Attribute 25018, the Object Class is WebAddress 25020, the Property is Language Code 25022, the Representation/Association term is code 25024, the Type term is xsd 25026, the Type Name term is Language 25028, and the Length is from two to nine 25030. The Cardinality between the GDT Web Address 25000 and the language Code 25016 is zero or one 25032.

GDT WebAddress 25000 may be used for linking to further information for the user. For example, the information might be detailed, hypertext-based information about a product, organization, or company. In an embodiment, the hypertext documents linked to by means of WebAddress may not be used for further process-dependent processing.

(hhhhhhhh) WorkAgreementID

A GDT WorkAgreementID 25100 is a unique ID for a work agreement. A work agreement is an agreement between an employee and an employer. The employee agrees to perform work and the employer agrees to provide remuneration for the work performed. A work agreement comprises numerous other obligations, in addition to the main obligation (remuneration for work), e.g., obligations in terms of loyalty, reporting, and benefits. Examples of work agreements include employment contracts, placement contracts, traineeships, and training contracts. An example is: <WorkAgreementID>1234567890123456</WorkAgreementID>.

The structure of GDT WorkAgreementID 25100 is depicted in FIG. 251.

The schemeID indicates the scheme according to which the identifier was assigned. Currently, the following illustrative schemes are supported: 1) WorkAgreementGUID, which identifies the work agreement using a Global Unique Identifier, and 2) WorkAgreementID, which identifies the work agreement using an internal identifier of the schemeAgency.

The schemeAgencyID specifies the business system in which the ID was assigned. If the "WorkAgreementGUID" is used for the schemeID, the WorkAgreementID may comprise one to forty places. If the WorkAgreementID is used, the WorkAgreementID may comprise 1 to 16 places and may be alphanumeric.

If the schemeID or schemeAgencyID have not been specified, it may be possible to determine them from the context. The WorkAgreementID may be used in the same way as the personnel number in the R/3 System.

(iiiiiiii) BusinessTransactionDocumentItemProcessingTypeCode

A BusinessTransactionDocumentItemProcessingTypeCode 31800 is the coded representation of the way in which an item in a business document is processed. In an embodiment, a BusinessTransactionDocumentItemProcessingTypeCode 31800 is defined as a transaction item type in the business transaction of the SAP CRM/EBP 4.0 object model. The code can control the internal behavior of a document and its structure, among other things. An example (instance) of BusinessTransactionDocumentItemProcessingTypeCode 31800 is:

<BusinessTransactionDocumentItemProcessingTypeCode>DLV</BusinessTransactionDocumentItemProcessingTypeCode>.

The GDT BusinessTransactionDocumentItemProcessingTypeCode 31800 is depicted in FIG. 318. For the GDT BusinessTransactionDocumentItemProcessingTypeCode 318, the Object Class term is Business Transaction Document Item 31802, the Property term is Processing Type 31804, the Representation/Association term is Code 31806, the Type term is CCT 31808, the Type Name term is Code 31810, and the Length is from one to four 31812.

The BusinessTransactionDocumentItemProcessingTypeCode 31800 is a customer-specific code list. In an embodiment, a BusinessTransactionDocumentItemProcessingTypeCode 31800 refers to a single BusinessTransactionDocumentItemTypeCode. A BusinessTransactionDocumentProcessingTypeCode may be used for business objects. The BusinessTransactionDocumentItemProcessingTypeCode 31800 can be used to control the processes relating to a document item (defined by the BusinessTransactionDocumentItemTypeCode). The following are examples of code semantics:

| | | |
|---|---|---|
| Delivery: | DLV | Standard delivery item type |
| Delivery: | RET | Standard returns item type |
| Sales order: | TAN | Standard order item type |

In an illustrative examples, delivery item type, purchase order item type, order item type, or CRM/SRM item type are equivalents in R/3 and CRM/SRM. A GDT length of four was selected, in line with these.

The code differs from the BusinessTransactionDocumentItemTypeCode as follows: BusinessTransactionDocumentItemTypeCode is the coded representation of an item type in a document occurring in the context of business transactions. The document item type describes the (business) nature of document items that are similar and defines the basic properties of document items of this type. The code differs from the DeliveryTypeCode as follows: DeliveryTypeCode is the coded representation of a delivery type, which describes the business nature and basic properties of the delivery for the purposes of its logistical processing.

(jjjjjjjj) BusinessTransactionDocumentProcessingTypeCode

The GDT BusinessTransactionDocumentProcessingTypeCode 31900 is the coded representation of the way in which a business document is processed. In an embodiment, the GDT BusinessTransactionDocumentProcessingTypeCode 31900 is a transaction type in the business transaction of the SAP CRM/EBP 4.0 object model. The code can control the internal behavior of a document and its structure, among other things. An example of GDT BusinessTransactionDocumentProcessingTypeCode 31900 is:

<BusinessTransactionDocumentProcessingTypeCode>DLVO</BusinessTransactionDoc umentProcessingTypeCode>

The GDT BusinessTransactionDocumentProcessingTypeCode 31900 is depicted in FIG. 319. For the GDT BusinessTransactionDocumentProcessingTypeCode 31900, the Object Class term is Business Transaction Document 31902, the Property term is Processing Type 31904, the Representation/Association term is Code 31906, the Type term is CCT 31908, the Type Name term is Code 31910, and the Length is from one to four 31912.

The BusinessTransactionDocumentProcessingTypeCode 31900 is a customer-specific code list and refers to a single BusinessTransactionDocumentTypeCode. A BusinessTransactionDocumentProcessingTypeCode 31900 may be used for business objects. The BusinessTransactionDocumentProcessingTypeCode 31900 may be used to control the methods of processing a document (defined by the BusinessTransactionDocumentTypeCode). The following are examples of code semantics:

| | |
|---|---|
| Delivery: | Standard delivery type (DLVO) |
| Sales order: | Standard order type (TA) |

In an embodiment, delivery type, purchase order type, order type, or CRM/SRM transaction type are equivalents in R/3 and CRM/SRM. A GDT length of four was selected, in line with these.

The BusinessTransactionDocumentProcessingTypeCode 31900 differs from BusinessTransactionDocumentTypeCode as follows: BusinessTransactionDocumentTypeCode is the coded representation of a type of document occurring in the context of business transactions. The document type describes the (business) nature of documents that are very similar and defines the basic properties of documents of this type. The BusinessTransactionDocumentTypeCode is a prefix for references, among other things.

The BusinessTransactionDocumentProcessingTypeCode 31900 differs from BusinessTransactionTypeCode as follows: BusinessTransactionTypeCode is the coded representation of a business transaction type. BusinessTransactionTypeCode is cross-BTD and describes the business transaction as such.

The BusinessTransactionDocumentProcessingTypeCode 31900 differs from DeliveryTypeCode as follows: DeliveryTypeCode is the coded representation of a delivery type, which describes the business nature and basic properties of the delivery for the purposes of its logistical processing.

(kkkkkkkkk) CancellationReasonCode

The GDT CancellationReasonCode 32000 is a coded representation for the reason for a cancellation. An example (instance) for the GDT CancellationReasonCode 32000 is:

```
<ReplenishmentOrder>
    ...
    <Item>
        <CancellationReasonCode>1</CancellationReasonCode>
    </Item>
    ...
</ReplenishmentOrder>.
```

The GDT CancellationReasonCode 32000 is depicted in FIG. 320. For the GDT CancellationReasonCode 320, the Property term is Cancellation Reason 32002, the Representation/Association term is Code 32004, the Type term is CCT 32006, the Type Name term is Code 32008, and the Length is from one to four 32010.

In an embodiment, the CancellationReasonCode 32000 may be, for example, a SAP-owned code list. Illustrative values (tailored first to the logistics demand) may be as shown in the following table:

| Code | Name | Description |
|---|---|---|
| 1 | Delivery date too late | The delivery date is too late for the successful processing of the business transaction. |
| 2 | Delivery date too early | The delivery date is too early for the successful processing of the business transaction. |
| 3 | Delivery quantity too large | The delivery quantity is too large for the successful processing of the business transaction. |
| 4 | Delivery quantity too small | The delivery quantity is too small for the successful processing of the business transaction. |
| 5 | Quality of the substitute product is inadequate | The quality of the substitute product is inadequate for successful processing of the business transaction. |

For each type of BusinessTransactionDocument it may be specified which CancellationReasonCodes 32000 are permitted. The CancellationReasonCode 32000 is used to motivate a cancellation from a business point of view. A reason for the cancellation may be specified, in particular in the case of document changes on the basis of previous confirmations by the business partner.

In an example, in SAP R/3, the data element ABGRU (cancellation reason code for quotations and orders) may correspond to the CancellationReasonCode 32000.

(lllllllll) CashDiscountDeductibleIndicator

The GDT CashDiscountDeductibleIndicator 32100 specifies whether a cash discount can be deducted from something or not. That "something" may be, for example, an invoice, credit memo, purchase order, sales order, or a corresponding item. An example (instance) for the GDT CashDiscountDeductibleIndicator 32100 is:

<CashDiscountDeductibleIndicator>true</CashDiscountDeductibleIndicator>.

The GDT CashDiscountDeductibleIndicator 32100 is depicted in FIG. 321. For the GDT CashDiscountDeductibleIndicator 32100, the Property term is CashDiscountDeductible 32102, the Representation/Association term is Indicator 32104, the Type term is CCT 32106, and the Type Name term is Indicator 32108.

Illustrative values of the CashDiscountDeductibleIndicator 32100 may be as follows:

true: Discount can be deducted.

false: Discount cannot be deducted.

(for the value range, see CCT:Indicator).

CashDiscountDeductibleIndicator 32100 may be used to specify whether a cash discount can be deducted, for example, from an invoice item at the time of payment.

(mmmmmmmmm) CustomsCommodityClassificationCode

The GDT CustomsCommodityClassificationCode 32200 is a coded representation of the customs-related classification of trading goods. An example (instance) of the GDT CustomsCommodityClassificationCode 32200 is:

<CustomsCommodityClassificationCode>85281252000</CustomsCommodityClassificationCode>.

In the above example, the code stands for "Television receivers, color, with integral tube, with a screen width/height ratio kl. 1, 5, with a diagonal measurement of the screen of kl.=42 cm (excluding incorporating video-recording or reproducing apparatus and video monitors)."The GDT CustomsCommodityClassificationCode 32200 is depicted in FIG. 322. For the GDT CustomsCommodityClassificationCode 32200, the Object Class term is Customs 32202, the Property term is CommodityClassification 32204, the Representation/Association term is Code 32206, the Type term is CCT 32208, the Type Name term is Code 32210, and the Length is between four and eleven 32212. The GDT CustomsCommodityClassificationCode 32200 may be restricted 32214.

In an embodiment, all character strings from four to 11 characters are allowed as value ranges. The CustomsCommodityClassificationCode 32200 may be structured as follows:

One—two characters: Chapter (for example, clothing made of woven fabric—Chapter 62)

Three—four characters: Item (for example, ladies' coats—Item 6202)

Five—six characters: Subitem Harmonized System (for example, ladies' coats made of wool—Subitem 6202 11)

Seven—eight characters: Combined Nomenclature (for example, ladies' coats made of wool, hand-made—6202 11 00)

Nine—11 characters: International and National Features (for example, ladies' coats made of wool, hand-made, ponchos—6202 11 00 0)

The basis for the first six characters of the code may be the Harmonized System (HS) that is managed by the World Customs Organization (WCO) and may provide an internationally valid classification for all trading goods. The WCO has the entry "1" in the DE3055. However, attributes such as schemeAgencyID may be optional.

In the example, the characters seven to 11 are used to classify products nationally or internationally (for example, see http://europa.eu.int/comm/taxation_customs/dds/en/tarhome.htm or TARIC).

The CustomsCommodityClassificationCode 32200 may be used primarily for classifying trading goods with tariff code numbers and for implementing regulatory measures.

(nnnnnnnnn) CustomsPreferentialStatementStatusCode

The GDT CustomsPreferentialStatementStatusCode 32300 is a coded representation of the status of a customs preferential statement of a vendor. An example (instance) of the GDT CustomsPreferentialStatementStatusCode 32300 is:

<CustomsPreferentialStatementStatusCode>02</CustomsPreferentialStatementStatusCod e>.

The GDT CustomsPreferentialStatementStatusCode 32300 is depicted in FIG. 323. For the GDT CustomsPreferentialStatementStatusCode 32300, the Object Class term is Customs 32302, the Property term is Preferential Statement Status 32304, the Representation/Association term is Code 32306, the Type term is CCT 32308, the Type Name term is Code 32310, and the Length is two 32312. The GDT CustomsPreferentialStatementStatusCode 32300 may be a restricted GDT 32314.

In an embodiment, the CustomsPreferentialStatement-StatusCode 32300 may have the following values:

| Code | Name | Description |
|---|---|---|
| 01 | Negative | Negative VendorDeclaration |
| 02 | Detailed Negative | Detailed Negative VendorDeclaration |
| 03 | Positive | Positive VendorDeclaration |

(ooooooooo) DeliveryTypeCode

The GDT DeliveryTypeCode 32400 is a coded representation of the type of a delivery. This type describes the (business) nature and basic features of the delivery for its logistical processing. An example (instance) of the GDT DeliveryType Code 32400 is:

<DeliveryTypeCode>0002</DeliveryTypeCode>.

The GDT DeliveryTypeCode 32400 is depicted in FIG. 324. For the GDT DeliveryTypeCode32400, the Object Class term is Delivery 32402, the Property term is Type 32402, the Representation/Association term is Code 32406, the Type term is CCT 32408, the Type Name term is Code 32410, and the Length is four 32412.

In an embodiment, illustrative values may be as follows:

| Code | Name | Description |
|---|---|---|
| 0001 | Delivery of new goods | Delivery of new undamaged products or products in their original packaging with the relevant logistical handling (such as use of special transport packaging, consideration of special picking instructions). |
| 0002 | Delivery of damaged goods or new goods requiring repair | Delivery of new but damaged products or products requiring repair with the relevant logistical handling (such as use of special transport packaging, consideration of special picking instructions). |
| 0003 | Delivery of used goods | Delivery of used products with the relevant logistical handling (such as use of simple transport packaging, no consideration of picking instructions). |
| 0004 | Delivery of scrap | Delivery of products for scrapping with the relevant logistical handling (such as no use of transport packaging, no consideration of picking instructions). |

The DeliveryTypeCode 32400 describes the features of the delivery that have an affect on its logistical processing; for example, on the type and quality of the packaging, the selection of the means of transport, and the handling of the goods in transit. The DeliveryTypeCode 32400 can be used for the ascertainment of goods for inbound and outbound deliveries. It can also be used to describe return deliveries.

In an embodiment, if there is communication with SAP R/3, the attributes of the DeliveryTypeCode 32400 can correspond to the SAP R/3 delivery types. The GDT may be defined with four digits in accordance with the LFART (CHAR4) field.

(ppppppppp) DueClearingIndicator

The GDT DueClearingIndicator 32500 indicates whether receivables and payables are cleared against each other or not. An example (instance) of the GDT DueClearingIndicator 32500 is <DueClearingIndicator>true</DueClearingIndicator>.

The GDT DueClearingIndicator 32500 is depicted in FIG. 325. For the GDT DueClearingIndicator 32500, the Category is element 32502, the Object Class term is Due 32504, the Property term is Clearing 32506, the Representation/Association term is Indicator 32508, the Type term is CCT 32510, and the Type Name term is Indicator 32512.

In an embodiment, the DueClearingIndicator 32500 can have the following values:

'true' Receivables and payables are cleared against each other.

'false' Receivables and payables are not cleared against each other.

With the DueClearingIndicator 32500, the tax office can be informed in a tax return whether an existing receivable to the tax office is to be reimbursed by it or cleared against existing or future payables.

(qqqqqqqqq) KanbanCardID

The CDT KanbanCardID 32600 is a unique identifier of a kanban card. In an embodiment, a kanban card is a reusable card with which a production area requests material "just-in-time" from a supplying location in the context of production and material flow control (Kanban is the Japanese word for "card"). An example (instance) for the CDT KanbanCardID 32600 is:

<KanbanCardID schemeAgencyID="MPL__002">4711</Kanban CardID>.

In the example, schemeAgencyID="MPL__002" indicates that the scheme was assigned by the business system "MPL__002".

The CDT KanbanCardID 32600 is depicted in FIG. 326. The CDT KanbanCardID 32600 includes attribute schemeAgencyID 32616. For the CDT KanbanCardID 32600, the Object Class term is Kanban Card 32602, the Property term is Identification 32604, the Representation/Association term is Identifier 32606, the Type term is CCT 32608, the Type Name term is Identifier 32610, and the Length is from one to ten 32612. The CDT KanbanCardID 32600 may be restricted 32614.

For the schemeAgencyID 32616, the Category is attribute 32618, the Object Class term is IdentificationSchemeAgency 32620, the Representation/Association term is Identifier 32622, the Type term is xsd 32624, the Type Name term is token 32626, and the Length is from one to sixty 32628. The cardinality between the schemeAgencyID 32616 and the CDT KanbanCardID 32600 is either zero or one 32630. The schemeAgencyID 32616 is optional 32632.

KanbanCardID 32600 is an alphanumeric identifier (with no distinction between uppercase and lowercase) that is compliant with the rules for xsd:token. SchemeAgencyID is the business system in which the identifier was assigned.

KanbanCardIDs 32600 are used, for example, in purchase orders and forecast delivery schedules that have been generated within the context of kanban-based replenishment control.

Identifiers such as SchemeID may be included.

(rrrrrrrr) Log

The CDT Log 32700 is a sequence of messages that result when an application executes a task. An example (instance) of the CDT Log 32700 is:

```
<Log>
    <MaximumLogItemSeverityCode>3
    </MaximumLogItemSeverityCode>
    <Item>
        <TypeID>001(/CCM/)</TypeID>
        <SeverityCode>3</SeverityCode>
        <Note>Catalog cameras could not be published</Note>
    </Item>
    <Item>
        <TypeID>002(/CCM/)</TypeID>
        <SeverityCode>1</SeverityCode>
        <Note>Catalog cell phones successfully published</Note>
    </Item>
</Log>.
```

The CDT Log 32700 is depicted in FIG. 327. The CDT Log 32700 includes elements MaximumLogItemSeverityCode 32706 and Item 32724. For the CDT Log 32700, the Object Class term is Log 32702 and the Representation/Association term is Details 32704.

For the MaximumLogItemSeverityCode 32706, the Category is element 32708, the Object Class term is Log 32710, the Property Qualifier term is Maximum 32712, the Property term is LogItem Severity 32714, the Representation/Association term is Code 32716, the Type term is GDT 32718, and the Type Name term is LogItemSeverityCode 32720. The cardinality between the MaximumLogItemSeverityCode 32706 and the CDT Log 32700 is either zero or one 32722.

For the Item 32724, the Category is element 32726, the Object Class is Log 32728, the Property term is Item 32730, the Representation/Association term is Details 32732, the Type term is GDT 32734, and the Type Name term is LogItem 327336. The cardinality between the Item 32724 and CDT Log 32700 is one or more 32738.

MaximumLogItemSeverityCode 32706 is the coded representation of the maximum severity of a log message in a given log. Item 32724 is an individual log message (see GDT LogItem).

A Log 32700 can be used to transmit log messages with different levels of severity such as warnings and errors.

(sssssssss) NaturalPersonIndicator

The GDT NaturalPersonIndicator 32800 specifies whether the party is a natural person or not. In an embodiment, people are natural persons. An example (instance) of the GDT NaturalPersonIndicator 32800 is: <NaturalPersonIndicator>true</NaturalPersonIndicator>.

The GDT NaturalPersonIndicator 32800 is depicted in FIG. 328. For the GDT NaturalPersonIndicator 32800, the Property term is Natural Person 32802, the Representation/Association term is Indicator 32804, the Type term is CCT 32806, and the Type Name term is Indicator 32808.

In an embodiment, illustrative values of the NaturalPersonIndicator 32800 may be:

'True' The party is a natural person.

'False' The party is not a natural person.

(See the CCT: Indicator for the value range).

The GDT NaturalPersonIndicator 32800 is used to indicate that a party is a natural person or a legal person.

In an embodiment, the following dictionary objects are assigned to this GDT in mySAP systems:

Data element: BU_NATURAL_PERSON

Domain: BU_NATURAL_PERSON (ttttttttt) PackingListID

The GDT PackingListID 32900 is a unique identifier for a packing list. In an embodiment, a packing list is a list of packing data for the products from one or more delivery items. The packing list may contain data for the load carriers used to pack these products (such as crates or mesh box pallets), as well as for the weight, volume and quantity of the packed products. An example (instance) of the GDT PackingListID 32900 is:

<PackingListID>XYZ1234AZ5</PackingListID>.

The GDT PackingListID 32900 is depicted in FIG. 329. For the GDT PackingListID 32900, the Object Class term is Packing List 32902, the Property term is Identification 32904, the Representation/Association term is Identifier 32906, the Type term is CCT 32908, the Type Name term is Identifier 32910, and the Length is from one to thirty-five 32912. The GDT PackingListID 32900 may be a restricted GDT 32914.

In an embodiment, the vendor creates packing lists for the products of one or more delivery items. These lists accompany the physical shipment but may not exist as independent documents in the application systems. The PackingListID 32900 assigned by the vendor can be used to identify the packing lists that belong to a delivery. In contrast to the HandlingUnit, which has data for packaging materials and a packing hierarchy, a packing list contains simplified, but sufficient, packing information for products from a delivery.

(uuuuuuuuu) PartyTaxID

The GDT PartyTaxID 33000 is an identifier for a taxpayer assigned by a tax authority. An example (instance) for the GDT PartyTaxID 33000 is:

```
<BuyerParty>
    <TaxID schemeID="DE0">DE118618422</TaxID>
</BuyerParty>.
```

The GDT PartyTaxID 33000 is depicted in FIG. 330. The GDT PartyTaxID 33000 includes attribute schemeID 33018. For the GDT PartyTaxID 33000, the Object Class term is Party 33002, the Property Qualifier term is Tax 33004, the Property term is Identification 33006, the Representation/Association term is Identifier 33008, the Type term is CCT 33010, the Type Name term is Identifier 33012, and the Length is from one to twenty 33014. The GDT PartyTaxID 33000 may be a restricted GDT 33016.

For the schemeID 33018, the Category is attribute 33020, the Object Class term Identification Scheme 33022, the Property term is Identification 33024, the Representation/Association term is Identifier 33026, the Type term is xsd 33028, the Type Name term is token 33030, and the Length is from three to four 33032. The cardinality between the schemeID 33018 and the GDT PartyTaxID 33000 is one.

PartyTaxID 33000 contains a tax number that is up to 20 characters long. The schemeID 33018 attribute specifies what kind of tax number the tax number is. The schemeIDs 33018 may be defined in the GDT TaxIdentificationNumberTypeCode, for example, by DE0 for a German VAT registration number.

Tax numbers are used to identify taxpayers. A taxpayer may have more than one tax number, since there are various types of tax numbers. In certain countries, for example, the tax number may be provided when filing a tax return or remitting taxes, as well as on invoices.

(vvvvvvvvv) PriceSpecificationElement

The GDT PriceSpecificationElement 33100 is the specification of a price, discount or surcharge that depends on a combination of properties, and that is valid for a specific period of time. An example (instance) of the GDT PriceSpecificationElement 33100 for a special product is:

A special price of 29,99 EUR per piece (without scales) is agreed upon for the product that is represented by the identifier 4711. The price agreement is valid from 1.1.2004 to 31.12.2006.

(Note: In the example, TypeCode 1010 represents the specification of a special price according to GDT:PriceSpecificationElementTypeCode; unitCode C62 is one piece according to UN/ECE Recommendation 20).

```
<PriceSpecificationElement>
    <TypeCode>1010</TypeCode>
    <ValidityPeriod>
        <StartDate>2004-01-01</StartDate>
        <EndDate>2006-12-31</EndDate>
    </ValidityPeriod>
    <PropertyDefinitionClassID>SALES</PropertyDefinitionClassID>
    <PropertyValuation>
        <PriceSpecificationElementPropertyReference>
    <PriceSpecificationElementPropertyID>PRODUCT_ID
</PriceSpecificationElementPropertyID>
        </PriceSpecificationElementPropertyReference>
        <PriceSpecificationElementPropertyValue>
            <ID>4711</ID>
        </PriceSpecificationElementPropertyValue>
    </PropertyValuation>
    <Price>
        <Amount currencyCode="EUR">29.99</Amount>
        <BaseQuantity unitCode="C62">1</BaseQuantity>
    </Price>
    </PriceSpecificationElement>
```

An example (instance) of the GDT PriceSpecificationElement 33100 for the specification of a discount for a product depending on the delivery location is as follows:

The product that is represented by the identifier 4711 is granted a 5% discount for deliveries to Paris (represented by the identifier for location F75). The discount agreement is valid from 1.1.2004 to 31.12.2006.

(Note: In the example, TypeCode 2200 represents the specification of a discount or surcharge as a result of special properties in the master data used according to GDT PriceSpecificationElementTypeCode.)

```
    <PriceSpecificationElement>
    <TypeCode>2200</TypeCode>
    <ValidityPeriod>
        <StartDate>2004-01-01</StartDate>
        <EndDate>2006-12-31</EndDate>
    </ValidityPeriod>
    <PropertyDefinitionClassID>SALES</PropertyDefinitionClassID>
    <PropertyValuation>
        <PriceSpecificationElementPropertyReference>
    <PriceSpecificationElementPropertyID>PRODUCT_ID
</PriceSpecificationElementPropertyID>
        </PriceSpecificationElementPropertyReference>
        <PriceSpecificationElementPropertyValue>
            <ID>4711</ID>
        </PriceSpecificationElementPropertyValue>
    </PropertyValuation>
    <PropertyValuation>
        <PriceSpecificationElementPropertyReference>
    <PriceSpecificationElementPropertyID>LOCATION_ID
</PriceSpecificationElementPropertyID>
        </PriceSpecificationElementPropertyReference>
        <PriceSpecificationElementPropertyValue>
            <ID>F75</ID>
        </PriceSpecificationElementPropertyValue>
    </PropertyValuation>
    <Percent>-5</Percent>
    </PriceSpecificationElement>.
```

The GDT PriceSpecificationElement 33100 is depicted in FIG. 331. The GDT PriceSpecificationElement 33100 includes elements TypeCode 33106, ValidityPeriod 33122, PropertyDefinitionClassID 33138, PropertyValuation 33154, Price 33170, Percent 33186, FixedAmount 33102A, and ScaleLine 33118A. For the GDT PriceSpecificationElement 33100, the Object Class term is PriceSpecificationElement 33102 and the Representation/Association term is Details 33104.

For the TypeCode 33106, the Category is element 33108, the Object Class term is PriceSpecificationElement 33110, the Property term is Type 33112, the Representation/Association term is Code 33114, the Type term is GDT 33116, and the Type Name term is PriceSpecificationElementTypeCode 33118. The cardinality between the TypeCode 33106 and the GDT PriceSpecificationElement 33100 is one.

For the ValidityPeriod 33122, the Category is element 33124, the Object Class term is PriceSpecificationElement 33126, the Property term is Validity Period 33128, the Representation/Association term is Period 33130, the Type term is GDT 33132, and the Type Name term is DateTimePeriod 33134. The cardinality between the ValidityPeriod 33122 and the GDT PriceSpecificationElement 33100 is one.

For the PropertyDefinitionClassID 33138, the Category is element 33140, the Object Class term is PriceSpecificationElement 33142, the Property term is PropertyDefinitionClassIdentification 33144, the Representation/Association term is Identifier 33146, the Type term is GDT 33148, and the Type Name term is PriceSpecificationElementPropertyDefinitionClassID 33150. The cardinality between the PropertyDefinitionClassID 33138 and the GDT PriceSpecificationElement 33100 is either zero or one.

For the PropertyValuation 33154, the Category is element 33156, the Object Class term is PriceSpecificationElement 33158, the Property term is PropertyValuation 33160, the Representation/Association term is PriceSpecificationElementPropertyValuation 33162, the Type term is GDT 33164, and the Type Name term is PriceSpecificationElementPropertyValuation 33166. The cardinality between the PropertyValuation 33154 and the GDT PriceSpecificationElement 33100 is one or more.

For the Price 33170, the Category is element 33172, the Object Class term is Value 33174, the Property term is Price 33176, the Representation/Association term is Price 33178, the Type term is GDT 33180, and the Type Name term is Price 33182. The cardinality between the Price 33170 and the GDT PriceSpecificationElement 33100 is either zero or one.

For the Percent 33186, the Category is element 33188, the Object Class term is Value 33190, the Property term is Percent 33192, the Representation/Association term is Percent 33194, the Type term is GDT 33196, the Type Name term is Percent 33198. The cardinality between the Percent 33186 and the GDT PriceSpecificationElement 33100 is either zero or one.

For the FixedAmount 33102A, the Category is element 33104A, the Object Class term is Value 33106A, the Property term is Fixed amount 33108A, the Representation/Association term is Amount 33110A, the Type term is GDT 33112A, and the Type Name term is Amount 33114A. The cardinality between the FixedAmount 33102A and the GDT PriceSpecificationElement 33100 is either zero or one.

For the ScaleLine 33118A, the Category is element 33120A, the Object Class term is PriceSpecificationElement 33122A, the Property term is ScaleLine 33124A, the Representation/Association term is PriceSpecificationElemetnScaleLine 33126A, the Type term is GDT 33128A, and the Type Name term is PriceSpecificationElementScaleLine 33130A. The cardinality between the ScaleLine 33118A and the GDT PriceSpecificationElement 33100 is either zero or unbounded.

PriceSpecificationElement 33100 has the following elements:

TypeCode—Coded representation of the type of specification of the price, discount or surcharge.

ValidityPeriod—Validity period for the specification of the price, discount or surcharge.

PropertyDefinitionClassID—Identifier of the property definition class for which several properties are defined. It identifies the business area according to the functional unit in an enterprise, in which the specification of the price, discount or surcharge is used, and which is responsible for the respective activities (regardless of the underlying organizational structure). In an embodiment, permitted properties in the GDT:PriceSpecificationElement include:

| | |
|---|---|
| PURCHASE | Purchasing |
| SALES | Sales and Distribution (Sales/Service). |

PropertyValuation—Property valuation on whose combination the agreement of price, discount or surcharge depends. Permitted properties may be specified via the respective property definition class. The property valuation can identify or characterize the specification of the price, discount or surcharge. The combination of identifying property valuations may be unique for the specification of the price, discount or surcharge together with the type of specification and the end of the validity period.

Price—Specification of a price (without scales).

Percent—Specification of percent for discount or surcharge (without scales).

FixedAmount—Fixed amount for discounts or surcharges (without scales).

ScaleLine—Scale line for the specification of price, discount or surcharge.

The specification of a property definition class in the PropertyDefinitionClassID element may be optional, if the business area for specifying the price, discount or surcharge, or the respective property definition class from the application that uses the GDT:PriceSpecificationElement is known. A property definition class in the PropertyDefinitionClassID element may have higher priority than that which is known from the business area of the application.

The element PropertyValuation may contain value assignments for properties for which a property reference is defined using the property definition class that is known. In an embodiment, each of these property references are not be contained in more than one PropertyValuation element. At least one PropertyValuation element may be identifying, that is, with a value of "1" for PriceSpecificationElement/PropertyValuation/TypeIndicator.

In an embodiment, either at least one Price, Percent or FixedAmount element is specified, or at least one or more ScaleLine elements exists. If one of the Price, Percent or FixedAmount elements is specified, a ScaleLine element may not exist. If at least one ScaleLine element is specified, none of the Price, Percent or FixedAmount elements may exist. The same type for the scale rate PriceSpecificationElement/ScaleLine/Price, PriceSpecificationElement/ScaleLine/Percent or PriceSpecificationElement/ScaleLine/FixedAmount may be specified in the ScaleLine elements. Further, the number of PriceSpecificationElement/ScaleLine/AxisStep elements may correspond in the ScaleLine elements.

PriceSpecificationElement/ScaleLine/AxisStep/IntervalBoundaryTypeCode may be the same in the ScaleLine elements for PriceSpecificationElement/ScaleLine/AxisStep with the same PriceSpecificationElement/ScaleLine/AxisStep/ScaleAxisBaseCode.

(wwwwwwwww) PriceSpecificationElementPropertyDefinitionClassID

The GDT PriceSpecificationElementPropertyDefinitionClassID 33200 is a unique identifier for a property definition class for specifying a price, discount or surcharge. The GDT PriceSpecificationElementPropertyDefinitionClass 33200 classifies a class for defining properties for which the specification of a price, discount, or surcharge is possible. It defines the business environment according to the functional unit in an organization in which the specification of a price, discount, or surcharge is used, and which, (regardless of the underlying organizational structure), is responsible for the respective activities. The properties defined in GDT PriceSpecificationElementPropertyDefinitionClass 33200 represent the characteristics of this business environment for the specification of a price, discount, or surcharge. An example (instance) is as follows:

```
</PriceSpecificationElementPropertyDefinitionClassID>
    SALES
</PriceSpecificationElementPropertyDefinitionClassID>.
```

The GDT PriceSpecificationElementPropertyDefinitionClassID 33200 is depicted in FIG. 332. For the GDT PriceSpecificationElementPropertyDefinitionClassID 33200, the Object Class term is PriceSpecificationElementPropertyDefinitionClass 33202, the Property term is Identification 33204, the Representation/Association term is Identifier 33206, the Type term is CCT 33208, the Type Name term is Identifier 33210, and the Length is from one to fifty 33212. The GDT PriceSpecificationElementPropertyDefinitionClassID may be a restricted GDT 33214.

For a description of ranges, see CCT Identifier above. In an embodiment, permitted values for GDT PriceSpecificationElementPropertyDefinitionClassID include:

| | |
|---|---|
| PURCHASE | Purchasing |
| SALES | Sales and Distribution (Sales/Service). |

(xxxxxxxxx) PricingPriceSpecificationElementPropertyID

The GDT PricingPriceSpecificationElementPropertyID 33300 is a unique identifier of a property for the specification of a price, discount or surcharge. Properties are determining elements on whose combination the agreement of a price, discount or surcharge is dependent. An example (instance) of the GDT PricingPriceSpecificationElementPropertyID 33300 is:

```
<PriceSpecificationElementPropertyID>
    PRODUCT_ID
</PriceSpecificationElementPropertyID>.
```

The GDT PricingPriceSpecificationElementPropertyID 33300 is depicted in FIG. 333. For the GDT PricingPriceSpecificationElementPropertyID 33300, the Object Class term is PriceSpecificationElementProperty 33302, the Property term is Identification 33304, the Representation/Association term is Identifier 33306, the Type term is CCT 33308, the Type Name term is Identifier 33310, and the Length is from one to thirty 33312. The GDT PricingPriceSpecificationElementPropertyID 33300 may be a restricted GDT 33314.

For illustrative values, see CCT Identifier above. The property that is described by the identifier may be unique within the PriceSpecificationElementPropertyDefinitionClass property definition class. The property can be assigned to several property definition classes.

(yyyyyyyyy) PriceSpecificationElementPropertyReference

The GDT PriceSpecificationElementPropertyReference 33400 is the unique reference of a property for the specification of a price, discount or surcharge within a property definition class. An example (instance) of the GDT PriceSpecificationElementPropertyReference 33400 is:

```
<PriceSpecificationElementPropertyReference>
    <PriceSpecificationElementPropertyID>
        PRODUCT_ID
    </PriceSpecificationElementPropertyID >
    <PriceSpecificationElementPropertyDefinitionClassID>
        SALES
    </PriceSpecificationElementPropertyDefinitionClassID>
</PriceSpecificationElementPropertyReference>.
```

The GDT PriceSpecificationElementPropertyReference 33400 is depicted in FIG. 334. The GDT PriceSpecificationElementPropertyReference 33400 includes elements PriceSpecificationElementPropertyID 33406 and PriceSpecificationElementPropertyDefinitionClassID 33422. For the GDT PriceSpecificationElementPropertyReference 33400, the Object Class term is PriceSpecificationElementPropertyReference 33402 and the Representation/Association term is Details 33404.

For the PriceSpecificationElementPropertyID 33406, the Category is element 33408, the Object Class term is PriceSpecificationElementPropertyReference 33410, the Property term is PriceSpecificationElementPropertyIdentification 33412, the Representation/Association term is Identifier 33414, the Type term is GDT 33416, and the Type Name term is PriceSpecificationElementPropertyID 33418. The cardinality between the PriceSpecificationElementPropertyID 33406 and the GDT PriceSpecificationElementPropertyReference 33400 is one.

For the PriceSpecificationElementPropertyDefinitionClassID 33422, the Category is element 33424, the Object Class term is PriceSpecificationElementPropertyReference 33426, the Property term is PriceSpecificationElementPropertyDefinitionClassIdentification 33428, the Representation/Association term is Identifier 33430, the Type term is GDT 33432, and the PriceSpecificationElementPropertyDefinitionClassID 33434. The cardinality between the PriceSpecificationElementPropertyDefinitionClassID 33422 and the GDT PriceSpecificationElementPropertyReference 33400 is either zero or one.

PriceSpecificationElementPropertyID is an identifier of a property for the specification of a price, discount or surcharge. PriceSpecificationElementPropertyDefinitionClassID is an identifier of a property definition class for the specification of a price, discount or surcharge. The referenced property is defined for a property definition class. Specification of the PriceSpecificationElementPropertyDefinitionClassID element may be optional, if the property definition class is known uniquely in the respective context.

(zzzzzzzzz) PriceSpecificationElementPropertyValuation

The GDT PriceSpecificationElementPropertyValuation 33500 is the assignment of a value to a property for the specification of a price, discount or surcharge. A property valuation may be carried out when specifying a price, discount or surcharge to determine the specification. The property valuation can identify or characterize the specification. The combination of properties with an identifying property valuation is unique together with the validity period and the type of specification. Examples of the GDT PriceSpecificationElementPropertyValuation 33500 are:

```
<PriceSpecificationElementPropertyValuation>
    <PriceSpecificationElementPropertyReference>
        <PriceSpecificationElementPropertyID>
            PRODUCT_ID
        </PriceSpecificationElementPropertyID>
        <PriceSpecificationElementPropertyDefinitionClassID>
            SALES
        </PriceSpecificationElementPropertyDefinitionClassID>
    </PriceSpecificationElementPropertyReference>
    <PriceSpecificationElementPropertyValue>
        <ID schemeID="Kühlschränke">4711</ID>
    <PriceSpecificationElementPropertyValue>
</PriceSpecificationElementPropertyValuation>.
```

The GDT PriceSpecificationElementPropertyValuation 33500 is depicted in FIG. 335. The GDT PriceSpecificationElementPropertyValuation 33500 includes elements TypeIndicator 33506, PriceSpecificationElementPropertyReference 33522, and PriceSpecificationElementPropertyValue 33538. For the GDT PriceSpecificationElementPropertyValuation 33500, the Object Class term is PriceSpecificationElementPropertyValuation 33502 and the Representation/Association term is Details 33504.

For the TypeIndicator 33506, the Category is element 33508, the Object Class term is PriceSpecificationElementPropertyValuation 33510, the Property term is IType 33512, the Representation/Association term is Indicator 33514, the Type term is GDT 33516, and the Type Name term is Indicator 33518. The cardinality between the TypeIndicator 33506 and the GDT PriceSpecificationElementPropertyValuation 33500 is either zero or one.

For the PriceSpecificationElementPropertyReference 33522, the Category is element 33524, the Object Class term is PriceSpecificationElementPropertyValuation 33526, the Property term is PriceSpecificationElementProperty Reference 33528, the Representation/Association term is PriceSpecificationElementPropertyReference 33530, the Type term is GDT 33532, and the Type Name term is PriceSpecificationElementPropertyReference 33534. The cardinality between the PriceSpecificationElementPropertyReference 33522 and the GDT PriceSpecificationElementPropertyValuation 33500 is one 33536.

For the PriceSpecificationElementPropertyValue 33538, the Category is element 33540, the Object Class term is PriceSpecificationElementPropertyValuation 33542, the Property term is PriceSpecificationElementPropertyValue 33544, the Representation/Association term is PriceSpecificationElementPropertyValue 33546, the Type term is GDT 33548, and the Type Name term is PriceSpecificationElementPropertyValue 33550. The cardinality between the PriceSpecificationElemenPropertyValue 33538 and the GDT PriceSpecificationElementPropertyValuation 33500 is one 33552.

TypeIndicator is an indicator that specifies if the respective property valuation identifies or characterizes the specification of the price, discount or surcharge. In an embodiment, the values include:

| | |
|---|---|
| 1 | identifying property valuation |
| 0 | characterizing property valuation |

In an embodiment, the default value is "1", if the element is not used.

PriceSpecificationElementPropertyReference is a reference to the underlying property for which the property valuation should be represented.

PriceSpecificationElementPropertyValue is the value of the referenced property.

(aaaaaaaaaa) PriceSpecificationElementPropertyValue

The GDT PriceSpecificationElementPropertyValue 33600 is a value that is assigned to a property for the specification of a price, discount or surcharge. An example (instance) for the GDT PriceSpecificationElementPropertyValue 33600 is:

```
<PriceSpecificationElementPropertyValue>
    <IntegerValue>
        1
    </IntegerValue>
</PriceSpecificationElementPropertyValue>.
```

The GDT PriceSpecificationElementPropertyValue 33600 is depicted in FIG. 336. The GDT PriceSpecificationElementPropertyValue 33600 includes elements Code 33608, ID 33626, IntegerValue 33644, Date 33662, Time 33678, and Indicator 33694. For the GDT PriceSpecificationElementPropertyValue33600, the Category is element 33602, the Object Class term is PriceSpecificationElementPropertyValue 33604, and the Representation/Association term is Details 33606.

For the Code 33608, the Category is element 33610, the Object Class term is PriceSpecificationElementPropertyValue 33612, the Property term is Code 33614, the Representation/Association term is Code 33616, the Type term is CCT 33618, the Type Name term is Code 33620, and the Length is from one to fifty 33622. The cardinality between the Code 33608 and the GDT PriceSpecificationElementPropertyValue 33600 is either zero or one 33624.

For the ID 33626, the Category is element 33628, the Object Class term is PriceSpecificationElementPropertyValue 33630, the Property term is Identification 33632, the Representation/Association term is Identifier 33634, the Type term is CCT 33636, the Type Name term is Identifier 33638, and the Length is from one to fifty 33640. The cardinality between the ID 33626 and the GDT PriceSpecificationElementPropertyValue 33600 is either zero or one 33642.

For the IntegerValue 33644, the Category is element 33646, the Object Class term is PriceSpecificationElementPropertyValue 33648, the Property term is Integer Value 33650, the Representation/Association Qualifier term is Integer 33652, the Representation/Association term is Value 33654, the Type term is GDT 33656, and the Type Name term is IntegerValue 33658. The cardinality between the Integer- Value 33644 and the GDT PriceSpecificationElementPropertyValue 33600 is either zero or one 33660.

For the Date 33662, the Category is element 33664, the Object Class term is PriceSpecificationElementPropertyValue 33666, the Property term is Date 33668, the Representation/Association term is Date 33670, the Type term is GDT 33672, and the TypeName term is Date 33674. The cardinality between the Date 33662 and the GDT PriceSpecificationElementPropertyValue 33600 is either zero or one 33676.

For the Time 33678, the Category is element 33680, the Object Class term is PriceSpecificationElementPropertyValue 33682, the Property term is Time 33684, the Representation/Association term is Time 33686, the Type term is GDT 33688, and the Type Name term is Time 33690. The cardinality between the Time 33678 and the GDT PriceSpecificationElementPropertyValue 33600 is either zero or one 33692.

For the Indicator 33694, the Category is element 33696, the Object Class term is PriceSpecificationElementPropertyValue 33698, the Property term is Indicator 33600A, the Representation/Association term is Indicator 33602A, the Type term is GDT 33604A, and the Type Name term is Indicator 33606A. The cardinality between the Indicator 33694 and the GDT PriceSpecificationElementPropertyValue 33600 is either zero or one 33608A.

The structure of the GDT PriceSpecificationElementPropertyValue 33600 represents meta-information for property values. Hence the elements of GDT PriceSpecificationElementPropertyValue represent types of actual values:

Code—Specification of the coded representation of information.

ID—Specification of the identification of an object.

IntegerValue—Specification of a discrete, integer value.

Date—Specification of a calendar day.

Time—Specification of a point in time to the nearest second (time).

Indicator—Specification of a binary logical value.

In an embodiment, one element from the quantity Code, ID, IntegerValue, Date, Time or Indicator may be specified. The element that is appropriate for the type of the actual value is used.

The following is an example of the use of Code:

Example: Specification of a color code, for example red metallic vehicle paint (code 0042) (Colors can be used as properties within specifications for prices, discounts or surcharges: 1000 EUR surcharge for red metallic vehicle paint (code 0042).)

The following is an example of the use of ID:

Specification of an identifier for the location, for example location of a branch office in Hamburg (ID 4711) or Paris (ID 4712) (Identifiers for the location can be used as properties within specifications for prices, discounts or surcharges: 5% discount for deliveries to the branch office in Hamburg (ID 4711), 100 EUR surcharge for deliveries to the branch office in Paris (ID 4712).)

The following is an example of the use of IntegerValue:

Valuation of non-dimensional, integer properties, such as codes, indexes, consecutive numbers.

The following is an example of the use of Date:

Expiry date, sell-by date, date of manufacturing, filling or packaging, date of release, locking, order or delivery, and so on.

The following is an example of the use of Time:

Timestamp for specification to the nearest second of when a product is filled, produced, or certified, and so on.

The following is an example of the use of Indicator:

Properties with only two statuses: yes/no, on/off, and so on.

(bbbbbbbbbb) PriceSpecificationElementScaleLine

The GDT PriceSpecificationElementScaleLine 33700 is a scale line for the specification of a price, discount or surcharge. A single or two dimensional scale can be used when specifying a price, discount or surcharge. The scale comprises scale lines that define a price, discount or surcharge for each scale step. An example (instance) of the GDT PriceSpecificationElementScaleLine 33700 for the scale line for the specification of a price is as follows:

The scale is a one-dimensional ‘from’ price scale. The price is 29,99 EUR per piece from 10 pieces.

(Note: ScaleAxisBaseCode 1 represents a quantity according to GDT:ScaleAxisBaseCode;

IntervalBoundaryTypeCode 1 represents a ‘from’ price scale according to GDT:ScaleAxisStepIntervalBoundaryTypeCode;

unitCode C62 is one piece according to UN/ECE Recommendation 20.)

```
<PriceSpecificationElementScaleLine>
<ScaleAxisStep>
    <ScaleAxisBaseCode>1</ScaleAxisBaseCode>
    <IntervalBoundaryTypeCode>1</IntervalBoundaryTypeCode>
    <Quantity unitCode="C62">10</Quantity>
</ScaleAxisStep>
<Price>
    <Amount currencyCode="EUR">29.99</Amount>
    <BaseQuantity unitCode="C62">1</BaseQuantity>
</Price>
</PriceSpecificationElementScaleLine>.
```

The GDT PriceSpecificationElementScaleLine 33700 is depicted in FIG. 337. The GDT PriceSpecificationElementScaleLine 33700 includes elements ScaleAxisStep 33706, Price 33722, Percent 33738, and FixedAmount 33754. For the GDT PriceSpecificationElementScaleLine 33700, the Object Class term is PriceSpecificationElementScaleLine 33702 and the Representation/Association term is Details 33704.

For the ScaleAxisStep 33706, the Category is element 33708, the Object Class term is PriceSpecificationElementScaleLine 33710, the Property term is ScaleAxisStep 33712, the Representation/Association term is ScaleAxisStep 33714, the Type term is GDT 33716, and the Type Name term is ScaleAxisStep 33718. The cardinality between the ScaleAxisStep 33706 and the GDT PriceSpecificationElementScaleLine 33700 is either one or two 33720.

For the Price 33722, the Category is element 33724, the Object Class term is PriceSpecificationElementScaleLine 33726, the Property term is Price 33728, the Representation/Association term is Price 33730, the Type term is GDT 33732, and the Type Name term is Price 33734. The cardinality between the Price 33722 and the GDT PriceSpecificationElementScaleLine 33700 is either zero or one 33736.

For the Percent 33738, the Category is element 33740, the Object Class term is PriceSpecificationElementScaleLine 33742, the Property term is Percent 33744, the Representation/Association term is Percent 33746, the Type term is GDT 33748, and the Type Name term is Percent 33750. The cardinality between the Percent 33738 and the GDT PriceSpecificationElementScaleLine 33700 is either zero or one 33752.

For the FixedAmount 33754, the Category is element 33756, the Object Class term is PriceSpecificationElementScaleLine 33758, the Property term is FixedAmount 33760, the Representation/Association term is Amount 33762, the Type term is GDT 33764, and the Type Name term is Amount 33766. The cardinality between the FixedAmount 33754 and the GDT PriceSpecificationElementScaleLine 33700 is either zero or one 33768.

GDT PriceSpecificationElementScaleLine 33700 has the following elements:

ScaleAxisStep—Axis Step (scale dimension value) of a dimension of the scale step for which the scale line is defined for the specification of a price, discount or surcharge.

Price—Scale rate as specification of a price.

Percent—Scale rate for specifying the percent for discounts or surcharges.

FixedAmount—Scale rate for specifying a fixed amount for discounts or surcharges.

In an embodiment, the same PriceSpecificationElementScaleLine/ScaleAxisStep/ScaleAxisBaseCode is not be specified for different PriceSpecificationElementScaleLine/AxisStep elements. One of the Price, Percent or FixedAmount elements may exist. If an element that is classified by the GDT PriceSpecificationElementScaleLine has cardinality >1, the same type may be specified in all instances for the scale rate Price, Percent or FixedAmount. If an element that is classified by the GDT PriceSpecificationElementScaleLine has cardinality >1, the PriceSpecificationElementScaleLine/ScaleAxisStep elements may be specified in all instances with the same number of and the same characteristics for PriceSpecificationElementScaleLine/ScaleAxis-Step/ScaleAxisBaseCode.

For additional usage information for PriceSpecificationElementScaleLine 33700 see GDT PriceSpecificationElement above.

(cccccccccc) PriceSpecificationElementTypeCode

The GDT PriceSpecificationElementTypeCode 33800 is the coded representation of the type of specification of a price, discount or surcharge. An example (instance) of the GDT PriceSpecificationElementTypeCode 33800 is:

Specifies a special % or absolute discount based on the 50$^{th}$ anniversary of a company:

```
<PriceSpecificationElementTypeCode>
    2310
</PriceSpecificationElementTypeCode>.
```

The GDT PriceSpecificationElementTypeCode 33800 is depicted in FIG. 338. For the GDT PriceSpecificationElementTypeCode 33800, the Object Class term is PriceSpecificationElement 33802, the Property term is Type 33804, the Representation/Association term is Code 33806, the Type term is CCT 33808, the Type Name term is Code 33810, and the Length is four 33812. The GDT PriceSpecificationElementTypeCode 33800 may be a restricted GDT 33814.

In an embodiment, illustrative possible properties of the GDT PriceSpecificationElementTypeCode are as shown in the following table:

| Code | Name | Description |
|---|---|---|
| 1000 | Price | Specifies a price (not specified further) |
| 1010 | Special Price | Specifies a special price (not specified further)<br>E.g.: Price entered manually |
| 1100 | Basic Price | Specifies a basic price (not specified further)<br>E.g.: Catalog price, price from a price list, price per quantity |
| 1110 | Recommended Price | Specifies a price based on a recommended price<br>E.g.: Recommended retail price |
| 1120 | Price Requirement | Specifies a price based on a price requirement<br>E.g.: Cost price |
| 1200 | Price Property | Specifies a price based on special properties of the master data used (not specified further) |
| 1210 | Partner Group Price | Specifies a price based on group membership of the business partner<br>E.g.: Price for a major customer, price for a vendor or customer group |
| 1220 | Product Group Price | Specifies a price based on group membership of the product<br>E.g.: OEM price, special price for a product or price group |
| 1230 | Product Configuration Price | Specifies a price based on a specific product configuration<br>E.g.: Special price for metallic paint, for size “XL”, or a special edition |
| 1300 | Promotion Price | Specifies a price based on a promotion (not specified further) |
| 1310 | Event Price | Specifies a price based on a one-time sales event that is restricted to a certain time period<br>E.g.: Branch opening price, anniversary price |
| 1320 | Periodic Promotion Price | Specifies a price based on a recurring promotion that is restricted to a certain time period<br>E.g.: Christmas price, Easter sales promotion, summer sale |
| 1400 | Business Process Price | Specifies a price based on business processes that deviate from the business standard (not specified further) |
| 1410 | Value Limit Price | Specifies a price for a quantity of a product or the total document as a result of exceeding or falling short of a value limit<br>E.g.: Reserve price, minimum sales order value |
| 1420 | Quantity Limit Price | Specifies a price for the quantity of a product or the total document as a result of exceeding or falling short of a quantity limit<br>E.g.: Pallet price |
| 1430 | Agreement Price | Specifies a price for the quantity of a product or the total document as a result of a binding agreement, for example when ordering or when signing a contract<br>E.g.: Contract price |
| 2000 | Discount/ Surcharge | Specifies a discount or surcharge (not specified further) |

-continued

| Code | Name | Description |
|---|---|---|
| 2010 | Special Discount/ Surcharge | Specifies a special discount or surcharge (not specified further) E.g.: Discount entered manually |
| 2100 | Base Value Discount/ Surcharge | Specifies a base value discount or surcharge (not specified further) E.g.: Absolute discount, discount from a price list |
| 2200 | Property Discount/ Surcharge | Specifies a discount or surcharge based on special properties of the master data used (not specified further) |
| 2210 | Partner Group Discount/ Surcharge | Specifies a discount or surcharge based on the group membership of the business partner E.g.: Major customer discount, special discount for a vendor or customer group |
| 2220 | Product Group Discount/ Surcharge | Specifies a discount or surcharge based on the group membership of the product E.g.: OEM surcharge for a product, special discount for a product or price group |
| 2230 | Product Configuration Discount/ Surcharge | Specifies a discount or surcharge based on product configuration E.g.: Surcharge for metallic paint, surcharge for size "XL", discount for a special edition |
| 2300 | Promotion Discount/ Surcharge | Specifies a discount or surcharge based on a promotion (not specified further) |
| 2310 | Event Discount/ Surcharge | Specifies a discount or surcharge based on a one-time sales event that is restricted to a certain time period. E.g.: Branch opening discount, anniversary discount |
| 2320 | Periodic Promotion Discount/ Surcharge | Specifies a discount or surcharge based on a recurring promotion that is restricted to a certain time period E.g.: Christmas discount, Easter promotion, anniversary discount |
| 2340 | Coupon Discount/ Surcharge | Specifies a discount or surcharge based on a coupon or voucher E.g.: Coupon that is valid for manufacturer sales promotion |
| 2400 | Business Process Discount/ Surcharge | Specifies a discount or surcharge based on business processes that deviate from the business standard (not specified further) |
| 2410 | Value Limit Discount/ Surcharge | Specifies a discount or surcharge for the quantity of a product or the total document as a result of exceeding or falling short of the value limit E.g.: Minimum sales order value surcharge |
| 2420 | Quantity Limit Discount/ Surcharge | Specifies a price for a quantity of a product or the total document as a result of exceeding or falling short of the quantity limit E.g.: Pallet discount, surcharge for incomplete pallet |
| 2430 | Agreement Discount/ Surcharge | Specifies a discount or surcharge for the quantity of a product or the total document as a result of a binding agreement, for example when ordering or when signing a contract E.g.: Contract discount |
| 2500 | Calculative Processing Discount/ Surcharge | Specifies a discount or surcharge based on special calculative processing (not specified further) |
| 2510 | Free Goods | Specifies a discount based on free goods E.g.: 100% discount |
| 2520 | Rounding Difference | Specifies a discount or surcharge based on the clearing of rounding differences |
| 4000 | Transport Costs | Specifies transport costs (not specified further) |
| 4100 | Packaging | Specifies packaging (not further specified) |
| 4200 | Freight | Specifies freight (not further specified) |
| 5100 | Customs Duty | Specifies customs duty (not further specified) |
| 6000 | Terms of Payment | Specifies special terms of payment (not specified further) |
| 6100 | Cash Discount | Cash Discount (not specified further) |

The semantics for grouping code list entries are not fixed.

In an embodiment, the GDT PriceSpecificationElementTypeCode 33800 may be a proprietary code list with fixed predefined values. In that case, changes to the permitted values may involve changes to the interface.

In an embodiment, related standardized code list, such as Price.Type.Code (UN/CEFACT 5375), or Price.Specification.Code (UN/CEFACT 5387) are not used, as their semantics may differ. In the first case, categorization according to particular specifications takes on importance for the quality of products, while in the second case, it is the business circumstances leading to the determination of prices that are important.

(dddddddddd) ProductAttributeGroupID

The GDT ProductAttributeGroupID 33900 is a unique identifier for a product attribute group. In an embodiment, a product attribute group may arrange product attributes together in a group to describe the characteristics of a product and enables attributes that are associated with each other to be maintained together. See for example, SapTerm: Set Type at http://help.sap.com/saphelp_crm40sr1/helpdata/de/35/2cd77bd7705394e10000009b387c12/fram eset.htm.

An example (instance) of the GDT ProductAttributeGroupID 33900 is:

<ProductAttributeGroupID>SERVICEPLAN</ProductAttributeGroupID>.

The GDT ProductAttributeGroupID 33900 is depicted in FIG. 339. For the GDT ProductAttributeGroupID 33900, the Object Class term is Product AttributeGroup 33902, the Property term is Identification 33904, the Representation/Association term is Identifier 33906, the Type term is CCT 33908, the Type Name term is Identifier 33910, and the Length is from one to sixteen 33912. The GDT ProductAttributeGroupID may be a restricted GDT 33914.

For GDT ProductAttributeGroupID 33900, alphanumeric character strings may be used. The GDT ProductAttributeGroupID 33900 may be used in business objects and their replication messages. Attributes stored in a product attribute group can be assigned to several products and can therefore be re-used. Product attributes may be grouped according to subjective business criteria. In an example, a product attribute group is for administrative attributes such as Date and Created by. In another example, a product attribute group is for units of measure and their conversion factors to the base unit of measure.

In an embodiment, in SAP product master, the ProductAttributeGroupID is represented by the data element COMT_FRGTYPE_ID.

(eeeeeeeeee) PromotionInternalID

The GDT PromotionInternalID 34000 is a proprietary identifier for a promotion. In an embodiment, a promotion may be a marketing activity between the consumer goods industry and retail for a limited time period to increase brand equity, product awareness, and market share, to boost sales volumes, or to position new products or product groups. Examples of the GDT PromotionInternalID 34000 are:

<PromotionInternalID schemeAgencyID="MPL__002">1C743CEC501F6A4D</PromotionInternalID> schemeAgencyID="MPL__002" indicates that the scheme was assigned by the business system "MPL__002".

The GDT PromotionInternalID 34000 is depicted in FIG. 340. The GDT PromotionInternalID 34000 includes attribute schemeAgencyID 34018. For the GDT PromotionInternalID 34000, the Object Class term is Promotion 34002, the Property Qualifier term is Internal 34004, the Property term is Identification 34006, the Representation/Association term is Identifier 34008, the Type term is GDT 34010, the Type Name term is PromotionID 34012, and the Length is from one to thirty-five 34014. The GDT PromotionInternalID may be a restricted GDT 34016.

For the schemeAgencyID 34018, the Category is attribute 34020, the Object Class term is IdentificationSchemeAgency 34022, the Property term is Identification 34024, the Representation/Association term is Identifier 34026, the Type term is xsd 34028, the Type Name term is Token 34030, and the Length is from one to sixty 34032. The cardinality between the schemeAgencyID 34018 and the GDT PromotionInternalID 34000 is either zero or one 34034.

The schemeAgencyID 34018 attribute identifies the business system in which the identifier was assigned. The GDT PromotionInternalID 34000 is a projection of the GDT PromotionID that contains the schemeAgencyID attribute for describing an internally assigned ID. If an attribute is not specified explicitly in the use of the GDT, it may be specified through the context.

The PromotionInternalID 34000 may be used when both sender and recipient have access to shared master data; for example, during internal communication in an enterprise.

(ffffffffff) PromotionPartyID

The GDT PromotionPartyID 34100 is an identifier for a promotion assigned by a party. In an embodiment, a promotion may be a marketing activity between the consumer goods industry and retail for a limited time period to increase brand equity, product awareness, and market share, to boost sales volumes, or to position new products or product groups. An example (instance) of the GDT PromotionPartyID 34100 is:

<PromotionVendorID>B232-6HS</PromotionVendorID>.

The GDT PromotionPartyID 34100 is depicted in FIG. 341. For the GDT PromotionPartyID 34100, the Object Class term is Promotion 34102, the Property Qualifier term is Party 34104, the Property term is Identification34106, the Representation/Association term is Identifier 34108, the Type term is GDT 34110, the Type Name term is PromotionID 34112, and the Length is from one to thirty-five 34114. The GDT PromotionPartyID 34100 may be a restricted GDT 34116.

The PromotionPartyID may be a proprietary identifier. In the context of a message, the expression "Party" in PromotionPartyID may be replaced by the role of the party assigning the identifier; for example, PromotionSellerID if the identifier for the promotion is assigned by the SellerParty. When there is a need to distinguish between several schemes, schemeID and schemeVersionID may be included as attributes.

(gggggggggg) ReceivedQuantityAccumulation

The GDT ReceivedQuantityAccumulation 34200 are values for cumulated received quantities. An example (instance) of the GDT ReceivedQuantityAccumulation 34200 is:

```
<ReceivedQuantityAccumulation>
    <ReferencePeriod>
        <StartDateTime>2004-01-01T00:00:00Z</StartDateTime>
        <EndDateTime>2004-12-31T23:59:59Z </EndDateTime>
    </ReferencePeriod>
    <Quantity unitCode="CT">10000</Quantity>
    <ReconciliationDateTime>2005-01-01T00:00:00Z
    </ReconciliationDateTime>
    <ReconciliationQuantity unitCode="CT">0</ReconciliationQuantity>
</ReceivedQuantityAccumulation>.
```

The GDT ReceivedQuantityAccumulation 34200 is depicted in FIG. 342. The GDT ReceivedQuantityAccumulation 34200 includes elements ReferencePeriod 34208, Quantity 34224, ReconciliationDateTime 34242, and ReconciliationQuantity 34258. For the GDT ReceivedQuantityAccumulation 34200, the Object Class term is Received Quantity Accumulation 34202, the Property term is Details 34204, and the Representation/Association term is Details 34206.

For the ReferencePeriod 34208, the Category is Element 34210, the Object Class term is Received Quantity Accumulation 34212, the Property term is ReferencePeriod 34214, the Representation/Association term is Details 34216, the Type term is GDT 34218, and the Type Name term is DateTimePeriod 34220. The cardinality between the ReferencePeriod 34208 and the GDT ReceivedQuantityAccumulation 34200 is either zero or one 34222.

For the Quantity 34224, the Category is Element 34226, the Object Class term is Received Quantity Accumulation 34228, the Property term is Quantity 34230, the Representation/Association term is Quantity 34232, the Type term is GDT 34234, the Type Name term is Quantity 34236, and the Length is thirteen digits with six post decimal digits 34238.

The cardinality between the Quantity 34224 and the GDT ReceivedQuantityAccumulation 34200 is one 34240.

For the ReconciliationDateTime 34242, the Category is Element 34244, the Object Class term is Received Quantity Accumulation 34246, the Property term is Reconciliation 34248, the Representation/Association term is DateTime 34250, the Type term is GDT 34252, and the Type Name term is DateTime 34254. The cardinality between the ReconciliationDateTime 34242 and the GDT ReceivedQuantityAccumulation 34200 is either zero or one 34256.

For the ReconciliationQuantity 34258, the Category is Element 34260, the Object Class term is Received Quantity Accumulation 34262, the Property term is Reconciliation 34264, the Representation/Association term is Quantity 34266, the Type term is GDT 34268, and the Type Name term is Quantity 34270. The cardinality between the ReconciliationQuantity 34258 and the GDT ReceivedQuantityAccumulation 34200 is either zero or one 34272.

ReferencePeriod is a reference period for the accumulation.

Quantity is the received quantity that has been cumulated in the specified reference period up until the time that comes from the use context of the GDT. This quantity value is also described as the "cumulative received quantity" in certain industries.

ReconciliationDateTime is the time of completion of the accumulation, which can differ from the end date of the reference period. This time value is also described as the "reconciliation date" in certain industries. When the accumulation is completed for the ReconcilationDateTime, the accumulation quantity may be reset or set to zero. For example, several deliveries of goods are arranged in a calendar year (=period). The last delivery for this period takes place on Dec. 22, however (=ReconciliationDateTime). A further delivery, which arrives on December 30 (therefore, after the reconciliation date), must then be added to the following calendar year as a new accumulation period.

ReconciliationQuantity is the accumulated received quantity at the end of the reference period in accordance with the time specified in the ReconciliationDateTime. This quantity, which is also called "agreed cumulative quantity" in specific industries, may be used for the legally binding fixing of the received quantities at the sold-to party.

If the ReferencePeriod is not specified explicitly, the reference period for the accumulation may come from the use context of the GDT. This can be set up, for example, using a reference to a contract item (such as SchedulingAgreementReference). The ReconciliationDateTime may be used together with the ReconciliationQuantity. If the ReconciliationDateTime has not been specified, the ReconciliationQuantity refers to the end time of the ReferencePeriod.

The ReceivedQuantityAccumulation may be used for information purposes and for the (legally binding) synchronization of the goods recipient's received goods and the vendor's shipped goods. The transmission of cumulated quantity values may be used, in particular, in release orders or forecast delivery schedules (DeliveryScheduleNotification) in the high-tech and automotive industry.

Additional values for the cumulated received quantities, for instance, for the affected products and parties, may be described in the use context of the GDT.

(hhhhhhhhhh) ReleasedIndicator

The GDT ReleasedIndicator 34300 specifies whether something is released or not. The word "something" as used above may stand for an object. An example (instance) of the GDT ReleasedIndicator 34300 is: <ReleasedIndicator>true</ReleasedIndicator>.

The GDT ReleasedIndicator 34300 is depicted in FIG. 343. For the GDT ReleasedIndicator 34300, the Property term is Released Indicator 34302, the Representation/Association term is Indicator 34304, the Type term is CCT 34306, and the Type Name term is Indicator 34308.

In an embodiment, the values of the ReleasedIndicator may include:

'True' Something is released

'False' Something is not released

The ReleasedIndicator may be used for identifying objects that, for example, are explicitly released or not released through a validation for processes. In the context of use, a description may be given as to which object the ReleasedIndicator refers. Something that is not released can still be active from a business point of view.

(iiiiiiiiii) RelevanceIndicator

The GDT RelevanceIndicator 34400 indicates whether or not something is to be considered. The word "something" as used above may refer to specific objects, procedures, actions or transactions. An Example (Instance) of the GDT RelevanceIndicator is:

<PlanningRelevanceIndicator>true</PlanningRelevanceIndicator>.

The GDT RelevanceIndicator 34400 is depicted in FIG. 344. For the GDT RelevanceIndicator 34400, the Property term is Relevance 34402, the Representation/Association term is Indicator 34404, and the Type term is CCT: Indicator 34406.

In an embodiment, the RelevanceIndicator may have the following attributes:

True: Something is to be considered

False: Something is not to be considered.

For additional description of the value for RelevanceIndicator, see CCT:Indicator above.

For each RelevanceIndicator 34400, precise details may be given of what is or is not to be considered. A naming prefix (qualifier) may be used for this purpose. For example, the following qualifiers may be used:

PlanningRelevanceIndicator: The PlanningRelevanceIndicator specifies whether or not something is to be considered during planning.

ConfirmationRelevanceIndicator: The ConfirmationRelevanceIndicator indicates whether or not something is confirmation-relevant.

The RelevanceIndicator can be used to indicate that an order item is to be considered during a requirement calculation.

(jjjjjjjjjj) ReturnsIndicator

The GDT ReturnsIndicator 34500 specifies whether or not something is returned. An example (instance) of the GDT ReturnsIndicator 34500 is:

<ReturnsIndicator>true</ReturnsIndicator>.

The GDT ReturnsIndicator 34500 is depicted in FIG. 345. For the GDT ReturnsIndicator 34500, the Property term is Returns 34502, the Representation/Association term is Indicator 34504, and the Type term is CCT: Indicator 34506.

The ReturnsIndicator 34500 may have the following attributes:

True: This is a return.

False: This is not a return.

For additional description of the value for ReturnsIndicator, see CCT:Indicator above.

The ReturnsIndicator can be used in requirements planning to indicate whether or not the order item in question is a return.

(kkkkkkkkkk) ReturnMaterialAuthorisationID

The GDT ReturnMaterialAuthorisationID 34600 is a unique identifier for authorizing the return of a product (of the type material). An example (instance) of the GDT ReturnMaterialAuthorisationID is:

<ReturnMaterialAuthorisationID>XYZ1234AZ5</ReturnMaterialAuthorisationID>.

For the GDT ReturnMaterialAuthorisationID 34600, the Object Class term is Return Material Authorization 34602, the Property term is Identification 34604, the Representation/Association term is Identifier 34606, the Type term is CCT 34608, the Type Name term is Identifier 34610, and the Length is from one to twenty 34612.

For additional information on the values for GDT ReturnMaterialAuthorisationID 34600, see CCT:Identifier above.

The ReturnMaterialAuthorisationID may be assigned by the goods recipient—in the case of third-party deals, also by the original buyer or ordering party. The party performing the (return) delivery may use the ReturnMaterialAuthorisationID to prove authorization for the return of the material; for example, when a return delivery is announced via the DespatchedDeliveryNotification message.

(lllllllll) RevocationIndicator

The GDT RevocationIndicator 34700 indicates whether something is revoked or not. The word "something" used above generally describes, for example, a legally binding statement, agreement or authority. An example (instance) of the GDT RevocationIndicator 34700 is:

<CollectionAuthorisationRevocationIndicator>true</CollectionAuthorisationRevocationI ndicator>.

The GDT RevocationIndicator 34700 is depicted in FIG. 347. For the GDT RevocationIndicator 34700, the Category is Element 34702, the Property term is Revocation 34704, the Representation/Association term is Indicator 34706, the Type term is CCT 34708, and the Type Name term is Indicator 34710.

In an embodiment, the RevocationIndicator can include the following values:

| | |
|---|---|
| 'true' | Something is revoked |
| 'false' | Something is not revoked |

The RevocationIndicator 34700 can be used, for example, in a tax return or purchase order to display whether or not a collection authorization is revoked.

The context of an interface may contain a description of what is revoked with the RevocationIndicator 34700. This may be reflected in an appropriate prefix such as "CollectionAuthorisation".

(mmmmmmmmmm) ScaleAxisStep

The GDT ScaleAxisStep 34800 is a step (scale dimension value) of a scale axis. A dimension of the definition area of a scale is known as a scale axis. It may be defined as a scale dimension. That is, it may be defined via the completeness of the specified (discrete) scale dimension values as steps. The combination of one step of each scale axis makes up the scale step. An example (instance) of the GDT ScaleAxisStep 34800 is:

Axis step of a (one-dimensional) 'from' quantity scale:

The scale axis has the scale base type "quantity". The axis step amounts to 10 pieces.

(Note: ScaleAxisBaseCode 1 represents a quantity according to GDT:ScaleAxisBaseCode;

IntervalBoundaryTypeCode 1 represents the lower limit of an interval (from the scale dimension value under consideration to the next highest scale dimension value, but excluding the next highest scale dimension value) according to the GDT:ScaleAxisStepIntervalBoundaryTypeCode;

unitCode C62 is one piece according to UN/ECE Recommendation 20.)

```
<ScaleAxisStep>
    <ScaleAxisBaseCode>1</ScaleAxisBaseCode>
    <IntervalBoundaryTypeCode>1</IntervalBoundaryTypeCode >
    <Quantity unitCode="C62">10</Quantity>
</ScaleAxisStep>.
```

The GDT ScaleAxisStep 34800 is depicted in FIG. 348. The GDT ScaleAxisStep 34800 includes elements ScaleAxisBaseCode 34806, IntervalBoundaryTypeCode 34802, Amount 34838, Quantity 34854, DecimalValue 34870, and IntegerValue 34886. For the GDT ScaleAxisStep 34800, the Object Class term is ScaleAxisStep 34802, and the Representation/Association term is Details 34804.

For the ScaleAxisBaseCode 34806, the Category is Element 34808, the Object Class term is ScaleAxisStep 34810, the Property term is ScaleAxisBase 34812, the Representation/Association term is Code 34814, the Type term is GDT 34816, and the Type Name term is ScaleAxisBaseCode 34818. The cardinality between the ScaleAxisBaseCode 34806 and the GDT ScaleAxisStep 34800 is one 34820.

For the IntervalBoundaryTypeCode 34822, the Category is Element 34824, the Object Class term is ScaleAxisStep 34826, the Property term is Interval Boundary Type 34828, the Representation/Association term is Code 34830, the Type term is GDT 34832, and the Type Name term is ScaleAxisStepIntervalBoundaryTypeCode 34834. The cardinality between the IntervalBoundaryTypeCode 32822 and the GDT ScaleAxisStep 34800 is one 34836.

For the Amount 34838, the Category is Element 34840, the Object Class term is ScaleAxisStep 34842, the Property term is Amount 34844, the Representation/Association term is Amount 34846, the Type term is GDT 34848, and the Type Name term is Amount 34850. The cardinality between the Amount 34838 and the GDT ScaleAxisStep 34800 is either zero or one 34852.

For the Quantity 34854, the Category is Element 34856, the Object Class term is ScaleAxisStep 34858, the Property term is Quantity 34860, the Representation/Association term is Quantity 34862, the Type term is GDT 34864, and the Type Name term is Quantity 34866. The cardinality between the Quantity 34854 and the GDT ScaleAxisStep 34800 is either zero or one 34868.

For the DecimalValue 34870, the Category is Element 34872, the Object Class term is ScaleAxisStep 34874, the Property term is DecimalValue 34876, the Representation/Association term is DecimalValue 34878, the Type term is GDT 34880, and the Type Name term is DecimalValue 34882. The cardinality between the DecimalValue 34870 and the GDT ScaleAxisStep 34800 is either zero or one 34884.

For the IntegerValue 34886, the Category is Element 34888, the Object Class term is ScaleAxisStep 34890, the Property term is IntegerValue 34892, the Representation/Association term is IntegerValue 34894, the Type term is GDT 34896, and the Type Name term is IntegerValue 34898. The cardinality between the IntegerValue 34886 and the GDT ScaleAxisStep 34800 is either zero or one 34800A.

ScaleAxisStep 34800 has the following elements: ScaleAxisBaseCode is the coded representation of the scale base type of the scale axis; IntervalBoundaryTypeCode is the coded representation for the classification of the step (that is the discrete scale dimension value) as an interval boundary; Amount is the scale dimension value of the axis step as an amount; Quantity is the scale dimension value of the axis step as a quantity; DecimalValue is the scale dimension value of the axis step as the numeric value in decimal representation; IntegerValue is the scale dimension value of the axis step as the numeric value in decimal representation without decimal places.

ScaleAxisStep may contain one of the Amount, Quantity, DecimalValue or IntegerValue elements. The element appropriate for the scale dimension value may be used. ScaleAxisBaseCode may correspond to the same scale axis for all axis steps. For additional description on the use of ScaleAxisStep, see GDT:PriceSpecificationElementScaleLine.

(nnnnnnnnnn) SearchText

The GDT SearchText 34900 is a text that is searched for within a particular data content. The word "text" here refers to, for example, a character string. It can also contain special characters (*, ', ", etc.) to control the search. An Example of the GDT SearchText is:

<SearchText>Peter Müller</SearchText>.

The GDT SearchText 34900 is depicted in FIG. 349. For the GDT SearchText 34900, the Representation/Association Qualifier term is Search 34902, the Representation/Association term is Text 34904, the Type term is xsd 34906, and the Type Name term is string 34908. In an embodiment, there is no restriction on the length of the SearchText.

The SearchText can be used to look for instances of a given business object. For example, the SearchText "Peter Müller" can be used to find the invoices made from a company to the customer "Peter Müller". The data content in this case consists of attributes of the invoice object and attributes of the associated customer object.

In an embodiment, SearchText is a generic selection field of a query core service within SAP Enterprise Service Infrastructure (ESI).

(oooooooooo) SerialID

The GDT SerialID 35000 (serial number) is a unique identifier for an individual item that is assigned in the context of production. The "individual item" may be the instance of a product. The identifier of a product instance may be unique in the context of a product or a product category. For that reason, the SerialID may be the same for instances of different products. An example (instance) of the GDT SerialID is:

Identification of a vehicle number (vehicle identification number)

<SerialID>WVWZZZ1JZYP1749179</SerialID>.

The GDT SerialID 35000 is depicted in FIG. 350. For the GDT SerialID 35000, the Property term is Serial Identification 35002, the Representation/Association term Identifier 35004, the Type term is CCT 35006, the Type Name term is Identifier 35008, and the Length is from one to thirty 35010. The GDT SerialID may be a restricted GDT 35012.

A SerialID is an alphanumeric identifier (with may have no distinction between uppercase and lowercase) that is assigned to a product instance for its lifetime. For that reason, in an embodiment, it is not be assigned again to another instance of the same product during the (anticipated) lifetime of the product instance. The SerialID may be specified in connection with the related product identification ("product number" or "product category") because the combination of product identification and SerialID may be unique.

A SerialID may be used in addition to the product identification if individual items of the product are to be identified or must be identified. Serial numbers can be used for industry and consumer products and also, for example, for banknotes. In contrast to the equipment or asset number, the serial number is assigned and transmitted in the context of production.

(pppppppppp) ShippedQuantityAccumulation

The GDT ShippedQuantityAccumulation 35100 are values for cumulated shipped quantities. An example (instance) of the GDT ShippedQuantityAccumulation 35100 is:

```
<ShippedQuantityAccumulation>
    <ReferencePeriod>
        <StartDateTime>2004-01-01T00:00:00Z</StartDateTime>
        <EndDateTime>2004-12-31T23:59:59Z </EndDateTime>
    </ReferencePeriod>
    <Quantity unitCode="CT">10000</Quantity>
</ShippedQuantityAccumulation>.
```

The GDT ShippedQuantityAccumulation 35100 is depicted in FIG. 351. The GDT ShippedQuantityAccumulation 35100 includes elements ReferencePeriod 35108 and Quantity 35124. For the GDT ShippedQuantityAccumulation 35100, the Object Class term is Shipped Quantity Accumulation 35102, the Property term is Details 35104, and the Representation/Association term is Details 35106.

For the ReferencePeriod 35108, the Category is Element 35110, the Object Class term is Shipped Quantity Accumulation 35112, the Property term is ReferencePeriod 35114, the Representation/Association term is Details 35116, the Type term is GDT 35118, and the Type Name term is DateTimePeriod 35120. The cardinality between the ReferencePeriod 35108 and the GDT ShippedQuantityAccumulation 35100 is either zero or one 35122.

For the Quantity 35124, the Category is Element 35126, the Object Class term is Shipped Quantity Accumulation 35128, the Property term is Quantity 35130, the Representation/Association term is Quantity 35132, the Type term is GDT 35134, the Type Name term is Quantity 35136, and the Length is thirteen digits with six post-decimal digits 35138. The cardinality between the Quantity 35124 and the GDT ShippedQuantityAccumulation 35100 is one 35140.

ReferencePeriod is the reference period for the accumulation. Quantity is the shipped quantity that has been cumulated in the specified reference period up until the time that comes from the use context of the GDT. This quantity value may be also described as the "cumulative delivered quantity" in certain industries.

If the ReferencePeriod is not specified explicitly, the reference period for the accumulation may come from the use context of the GDT. This can be set up, for example, using a reference to a contract item (such as SchedulingAgreementReference).

The ShippedQuantityAccumulation may be used for information purposes and for the (legally binding) synchronization of the goods recipient's received goods and the vendor's shipped goods. The transmission of cumulated quantity values may be used, for example, in advanced shipping notifications (DespatchedDeliveryNotification) in the high-tech and automotive industry.

Additional values for the cumulated shipped goods, for instance, for the affected products and parties, may be described in the use context of the GDT.

(qqqqqqqqqq) SupplyChainExceptionStatusCode

The GDT SupplyChainExceptionStatusCode 35200 is a coded representation for the status of an exception that occurs in the supply chain during logistics planning or logistics execution. An example (instance) of the GDT SupplyChainExceptionStatusCode 35200 is:

```
<SupplyChainException>
    <StatusCode>RESOLVED</StatusCode>
</SupplyChainException>.
```

The GDT SupplyChainExceptionStatusCode 35200 is depicted in FIG. 352. For the GDT SupplyChainExceptionStatusCode 35200, the Object Class term is SupplyChainException 35202, the Property term is Status 35204, the Representation/Association term is Code 35206, the Type term is CCT 35208, the Type Name term is Code 35210, and the Length is from one to fifteen 35212. The GDT SupplyChainExceptionStatusCode may be a restricted GDT 35214.

In an embodiment, the values of the SupplyChainExceptionStatusCode may include values in the "Exception Status Code List" of the "EAN.UCC XML Business Message Standards, Version 1.3 (July 2003)". These are as follows:

| Code | Name | Description |
|---|---|---|
| ACKNOWLEDGED | Acknowledged | The exception has been acknowledged. |
| NEW | New | The exception is new. |
| RESOLVED | Resolved | The problem indicated by the exception has been resolved. |
| SUPERSEDED | Superseded | The original exception has been replaced by a modified exception. |
| UNRESOLVABLE | Unresolvable | The problem indicated by the exception cannot be resolved. |

In an example, schemeAgencyID may be included as an attribute. In an embodiment, if different code lists are supported, the schemeAgencyID="9" (EAN, International Article Numbering Association) or "113" (UCC, Uniform Code Council) International Numbering Association) from the DE 3055 may be specified to identify the code list given above.

The SupplyChainExceptionStatusCode may be set to "NEW" in the initial transmission of an exception. The other possible code values may be transmitted for the status of an exception when subsequent changes are made. For example, if an exception with the status code "NEW" occurs for "production standstill", and this problem is then resolved, the status code of the exception is "RESOLVED" in a subsequent message.

(rrrrrrrrr) SupplyChainExceptionTypeID

The GDT SupplyChainExceptionTypeID 35300 is a unique identifier for the type of exception that can occur in a supply chain during logistics planning or logistics execution. A type of a supply chain exception describes the (business) nature and basic features of the exception. The type definition can be based upon generally-accepted logistic key figures as well as industry-specific or proprietary business-specific criteria. Examples are "forecast deviation", "product shortage", "production standstill", or "delivery delay".

An Example (Instance) of the GDT SupplyChainExceptionTypeID is:

```
<SupplyChainException>
    ...
<TypeID schemeAgencyID="SCM_001">4711</TypeID>
    ...
</SupplyChainException>.
```

The GDT SupplyChainExceptionTypeID 35300 is depicted in FIG. 353. The GDT SupplyChainExceptionTypeID 35300 includes attribute schemeAgencyID 35316. For the GDT SupplyChainExceptionTypeID 35300, the Object Class term is SupplyChainException 35302, the Property term is Type 35304, the Representation/Association term is Identifier 35306, the Type term is CCT 35308, the Type Name term is Identifier 35310, and the Length is from one to four 35312. The GDT SupplyChainExceptionTypeID 35300 may be a restricted GDT 35314.

For the schemeAgencyID 35316, the Category is Attribute 35318, the Object Class term is IdentificationSchemeAgency 35320, the Property term is Identification 35322, the Representation/Association term is Identifier 35324, the Type term is XSD 35326, the Type Name term is Token 35328, and the Length is from one to sixty 35330. The cardinality between the schemeAgencyID 35316 and the GDT SupplyChainExceptionTypeID 35300 is either zero or one 35332.

The schemeAgencyID indicates the business system in which the ID was assigned. If the schemeAgencyID has not been specified, it may be determined from the context.

The SupplyChainExceptionTypeID may be used to describe the various exception types that can occur in the supply chain during logistics planning and logistics execution.

In an embodiment, in RosettaNet PIP 4A6 "NotifyOfForecastingException" the following code lists exists for different categories of SupplyChainExceptions: "ComparisonExceptionTypeCode", "IncidentExceptionTypeCode", "InformationExceptionTypeCode", and "ThresholdExceptionTypeCode". Through mapping, the GDT SupplyChainExceptionTypeID can also cover these codes. However, since there are a great number of industry-specific or business-specific requirements for the occurring SupplyChainExceptions, the GDT SupplyChainExceptionTypeID may use the identification concept instead of the code list concept.

The EAN.UCC "Exception Notification" may be restricted to a rough categorization of SupplyChainExceptions and may not use standardized code lists.

(ssssssssss) SystemAdministrativeData

The GDT SystemAdministrativeData 35400 is administrative data that is stored in a system. This data includes system users and change dates/times. An example (instance) of the GDT SystemAdministrativeData is:

```
<SystemAdministrativeData>
    <CreationDateTime>2004-04-19T11:11Z+01:00</CreationDateTime>
    <CreationUserAccountID>Bach</CreationUserAccountID>
    <LastChangeDateTime>2004-04-19T12:21Z+01:00
    </LastChangeDateTime>
    <LastChangeUserAccountID>Bach</LastChangeUserAccountID>
</SystemAdministrativeData>.
```

The GDT SystemAdministrativeData 35400 is depicted in FIG. 354. The GDT SystemAdministrativeData 35400 includes elements CreationDateTime 35406, CreationUserAccountID 35422, LastChangeDateTime 35438, and LastChangeUserAccountID 35454. For the GDT SystemAdministrativeData 35400, the Object Class term is System Administrative Data 35402 and the Representation/Association term is Details 35404.

For the CreationDateTime 35406, the Category is Element 35408, the Object Class term is System Administrative Data 35410, the Property term is Creation Date Time 35412, the Representation/Association term is DateTime 35414, the Type term is GDT 35416, and the Type Name term is DateTime 35418. The cardinality between the CreationDateTime 35406 and the GDT SystemAdministrativeData 35400 is one 35420.

For the CreationUserAccountID 35422, the Category is Element 35424, the Object Class term is System Administrative Data 35426, the Property term is Creation User Account ID 35428, the Representation/Association term is Identifier 35430, the Type term is GDT 35432, and the Type Name term is UserAccountID 35434. The cardinality between the CreationUserAccountID 35422 and the GDT SystemAdministrativeData 35400 is one 35436.

For the LastChangeDateTime 35438, the Category is Element 35440, the Object Class term is System Administrative Data 35442, the Property term is Last Change Date Time 35444, the Representation/Association term is DateTime 35446, the Type term is GDT 35448, and the Type Name term is DateTime 35450. The cardinality between the LastChangeDateTime 35438 and the GDT SystemAdministrativeData 35400 is either zero or one 35452.

For the LastChangeUserAccountID 35454, the Category is Element 35456, the Object Class term is System Administrative Data 35458, the Property term is Last Change User Account ID 35460, the Representation/Association term is Identifier 35462, the Type term is GDT 35464, and the Type Name term UserAccountID 35466. The cardinality between the LastChangeUserAccountID 35454 and the GDT SystemAdministrativeData 35400 is either zero or one 35468.

SystemAdministrativeData contains the following elements: CreationDateTime is the creation date/time (date and time stamp); CreationUserAccountID is the creator; LastChangeDateTime is the time (date and time stamp) of last change; and LastChangeUserAccountID is the last changed by.

SystemAdministrativeData may be used in Business Objects, Business Document Objects, or in any of their parts. When using the GDT SystemAdministrativData, a description may be used regarding to which administrative information reference is made. This may be expressed by using an appropriate prefix, for example, PurchaseOrder.

(ttttttttt) TaxAuthorityParty

The CDT TaxAuthorityParty 35500 is a party that collects and manages taxes. Examples (instances) for the CDT TaxAuthorityParty 35500 are:

```
<VATDeclaration>
...
<TaxAuthorityParty>
    <ID>2832</ID>
    <CountryCode>DE</CountryCode>
    <Address>
        <OrganisationFormattedName>Finanzamt Heidelberg
</OrganisationFormattedName>
        ...
    </Address>
</TaxAuthorityParty>
...
</VATDeclaration>.
```

The CDT TaxAuthorityParty 35500 is depicted in FIG. 355. The CDT TaxAuthorityParty 35500 includes elements ID 35506, CountryCode 35526, RegionCode 35542, and Address 35558. For the CDT TaxAuthorityParty 35500, the Object Class term is Tax Authority Party 35502 and the Representation/Association term is Details 35504.

For the ID 35506, the Category is Element 35508, the Object Class term is Tax Authority Party 35510, the Property term is Identification 35512, the Representation/Association term is Identifier 35514, the Type term is CCT 35516, the Type Name term is Identifier 35518, and the Length is twenty 35520. The cardinality between the ID 35506 and the CDT TaxAuthorityParty 35500 is either zero or one 35522. The ID may be restricted 35524.

For the CountryCode 35526, the Category is Element 35528, the Object Class term is Tax Authority Party 35530, the Property term is Country 35532, the Representation/Association term is Code 35534, the Type term is GDT 35536, and the Type Name term is CountryCode 35538. The cardinality between the CountryCode 35526 and the CDT TaxAuthorityParty 35500 is one 35540.

For the RegionCode 35542, the Category is Element 35544, the Object Class term is Tax Authority Party 35546, the Property term is Region 35548, the Representation/Association term is Code 35550, the Type term is GDT 35552, and the Type Name term is RegionCode 35554. The cardinality between the RegionCode 35542 and the CDT TaxAuthorityParty 35500 is either zero or one 35556.

For the Address 35558, the Category is Element 35560, the Object Class term is Tax Authority Party 35562, the Property term is Address 35564, the Representation/Association term is Address 35566, the Type term is GDT 35568, and the Type Name term is Address 35570. The cardinality between the Address 35558 and the CDT TaxAuthorityParty 35500 is either zero or one 35572. The Address may be restricted 35574.

ID is an identifier of the tax authority (tax authority number). Country code is the country of the tax authority. RegionCode is the region of the tax authority. Address is the company address of the tax authority. The unique identification of a tax authority may vary from country to country. In many countries, a tax authority number is used for identification, that is, the "ID" element (in Germany it is called the "Finanzamtsnummer"). "ID" may be unique in the context of the country of the tax authority (in the "CountryCode" element). In some countries, the region and/or company address is used for identification, that is, the "RegionCode" and "Address" elements. In the United States, for example, the IRS (Internal Revenue Service) in Washington D.C. is identified as the federal tax authority by "Address", whereas for the tax authorities of some states, "RegionCode" and "Address" are required. One example of this is CA BOE (California State Board of Equalization). Therefore, depending on the country, either the "ID" or a combination of "RegionCode" and "Address" may be specified.

The GDT TaxAuthorityParty contains information about a tax authority which may be used in A2A or B2B messages, for example, in the electronic tax return for tax on sales/purchases (VATDeclaration) to a tax authority.

(uuuuuuuuuu) TaxIdentificationNumberTypeCode

The GDT TaxIdentificationNumberTypeCode 35600 is a coded representation of the type of a tax number. An Example of the GDT TaxIdentificationNumberTypeCode 35600 is: <TaxIdentificationNumberTypeCode>DE0</TaxIdentificationNumberTypeCode>.

The GDT TaxIdentificationNumberTypeCode 35600 is depicted in FIG. 356. For the GDT TaxIdentificationNumberTypeCode 35600, the Object Class term is Tax Identification Number 35602, the Property term is Type 35604, the Representation/Association term is Code 35606, the Type term is CCT 35608, the Type Name term is Code 35610, and the Length is from three to four 35612.

Each country may have its own TaxIdentificationNumberTypeCodes. There may be different codes for different regions, different taxes or groups of taxes, or different types of taxpayers.

In an embodiment, SAP supplies the values in the form of the illustrative list presented in the table below. The first two characters in the code are the two-letter ISO code for the country (ISO 3166-1). The name of the TaxIdentificationNumberTypeCode is the official name used in the country in question (or its transcription).

| Code | Name | Description |
|---|---|---|
| AR0 | Código Único de Identificación Tributaria (CUIT) | Argentina: CUIT Number |
| AR1 | Clave Única de Identificación Laboral (CUIL) | Argentina: CUIL Number |
| AR2 | Número impuesto sobre renta | Argentina: Income Tax Number |
| AR3 | Número impuesto regional | Argentina: NIP Number or CM Number |
| AT0 | Umsatzsteuer-Identifikationsnummer (UID) | Austria: VAT Registration Number |
| AU0 | Australian Business Number (ABN) | Australia: ABN |
| BE0 | In French: Le numéro d'identification à la taxe sur la valeur ajoutée (N° TVA) In Dutch: BTW-Nummer (BTW-nr) | Belgium: VAT Registration Number |
| BE1 | In French: Numéro d'identification Ministère des Finances In Dutch: MinFin-Nummer | Belgium: Ministry Of Finance Registration Number |
| BE2 | In French: Le numéro d'identification à la taxe sur la valeur ajoutée (N° TVA) In Dutch: BTW-Nummer (BTW-nr) | Belgium: VAT Registration Number |
| BG1 | Edinen Identifikacionen kod | Bulgaria: Unified ID Code |
| BG2 | Edinen Grazhdanski Nomer | Bulgaria: Personal ID |
| BG3 | Osiguritelen nomer | Bulgaria: Social Security Number |
| BR1 | Cadastro Nacional de Pessoa Jurídica (CNPJ) | Brazil: CNPJ Number |
| BR2 | Cadastro de Pessoa Física (CPF) | Brazil: CPF Number |
| BR3 | Inscrição Estadual | Brazil: State Tax Number |
| BR4 | Inscrição Municipal | Brazil: Municipal Tax Number |
| CH1 | Mehrwertsteuer-Nummer (MwSt) | Switzerland: VAT Number |
| CL1 | Número de rol unico tributario (RUT) | Chile: RUT Number |
| CN1 | customer's (客户的增值税税号)-(ke hu de zeng zhi shui shui hao), vendor's (供应商的增值税税号)-(gong ying shang de zeng zhi shui shui hao) | China: Tax Number |
| CO1 | Número de identificación tributaria (NIT) | Colombia: NIT Number |
| CZ0 | danové identifikacní císlo (DIC) | Czech Republic: VAT Registration Number |
| CZ1 | danové identifikacní císlo (DIC) | Czech Republic: DIC Number |
| CZ2 | identifikacní císlo organizace (ICO) | Czech Republic: ICO Number |
| DE0 | Umsatzsteuer-ID-Nr. (USt-IdNr) | Germany: VAT Registration Number |
| DE1 | Ertragssteuernummer (§48) | Germany: Income Tax Number (§48) |
| DE2 | Umsatzsteuernr. (Gutschriftsverf. §14) | Germany: VAT Number (Credit Procedure §14) |
| DE3 | Elster Steuernummer | Germany: Elster Tax Number |
| DE4 | Steuernummer | Germany: Tax Number |
| DK0 | Det Centrale Virksomhedsregister Nummer (CRV-nummer) | Denmark: VAT Registration Number |
| EE0 | käibemaksukohustuslase registreerimisnumber (KMKR number) | Estonia: VAT Registration Number |
| ES0 | El número de identificación a efectos del Impuesto sobre el Valor Anadido | Spain: VAT Registration Number |
| ES1 | Número de Identificación Fiscal (NIF) | Spain: NIF Number |
| ES2 | Número de documento nacional de identidad (DNI) | Spain: DNI Number |
| FI0 | Arvonlisäveronumero (ALV-nro) | Finland: VAT Registration Number |
| FR0 | Le numéro d'identification à la taxe sur la valeur ajoutée (ID. TVA) | France: VAT Registration Number |
| FR1 | Numéro: identifier l'établissement de l'entreprise (SIRET) | France: SIRET Number |
| FR2 | Numéro: Système National Informatique pour le Répertoire des Entreprises et des Etablissements (SIREN) | France: SIREN Number |
| GB0 | VAT Registration Number (VAT Reg. No) | United Kingdom: VAT Registration Number |
| GB2 | National Insurance Number | United Kingdom: National Insurance Number |
| GR0 | Arithmos Forologikou Mitroou FPA (A.Φ.M) | Greece: VAT Registration Number |
| GR1 | arithmos taytotetas | Greece: Personal ID |

-continued

| Code | Name | Description |
|---|---|---|
| GR2 | arithmos phoroaogikoy metrooy. | Greece: AFM Number |
| HR1 | Jedinstveni Matični Broj Građana (JMBG) | Croatia: JMBG Number |
| HU0 | közösségi adószám | Hungary: VAT Registration Number |
| HU1 | adóazonosító szám | Hungary: Tax Number |
| ID1 | Nomor Pokok Wajib Pajak (NPWP) | Indonesia: NPWP Number |
| ID3 | Nomor Pengukuhan Pengusaha Kena Pajak (NPPKP) | Indonesia: NPPKP Number |
| IE0 | VAT Registration Number (VAT Reg. No) | Ireland: VAT Registration Number |
| IT0 | Codice IVA (Numero di Partita IVA, P. IVAT) | Italy: VAT Registration Number |
| IT1 | Codice Fiscale | Italy: Codice Fiscale |
| IT2 | Partita IVA | Italy: IVA Code |
| KR1 | Corporation Number | South Korea: Corporation ID |
| KR2 | Personal/Business Identification Number | South Korea: VAT Registration Number |
| KZ1 | Registratzionnyj Nomer Nalogoplatelschika (PHH) | Kazakhstan: RNN Number |
| LT0 | Pridetines vertes mokescio mokėtojo kodas (PVM moketojo kodas) | Lithuania: VAT Registration Number |
| LU0 | Le numéro d'identification à la taxe sur la valeur ajoutée (ID. TVA) | Luxembourg: VAT Registration Number |
| LV0 | PVN maksataja reģistrācijas numurs (PVN reģistrācijas numurs) | Latvia: VAT Registration Number |
| MC0 | Le numéro d'identification à la taxe sur la valeur ajoutée (ID. TVA) | Monaco: VAT Registration Number |
| MT0 | numru ta'l-identifikazzjoni tat-taxxa fuq il-valur miújud | Malta: VAT Registration Number |
| MX1 | Registro Federal de Contribuyentes (RFC) | Mexico: RFC Number |
| MX2 | | Mexico: VAT Liability |
| MX3 | Clave Unica de Registro de Poblacion (CURP) | Mexico: CURP Number |
| NL0 | BTW-identificatienummer (BTW-Nr.) | Netherlands: VAT Registration Number |
| NO2 | Foretaksnummer | Norway: Tax Number |
| PE1 | Número de registro unico de contribuyentes (RUC) | Peru: RUC Number |
| PH1 | Taxpayer Identification Number (TIN) | Philippines: Taxpayer ID Number |
| PL0 | Numer identyfikacji podatkowej (NIP) | Poland: VAT Registration Number |
| PL1 | Numer identyfikacji podatkowej (NIP) | Poland: NIP Number |
| PT0 | Número de identificação fiscal (NIPC) | Portugal: VAT Registration Number |
| RO1 | cod de identificare fiscala | Romania: Tax Number |
| RU1 | Individualnij Nalogovyj Numer (INN) | Russia: INN |
| RU2 | Obscherossijsky Klassifikator Predprijatij u Organizatchij (OKPO) | Russia: OKPO Code |
| RU3 | Kod Prichiny Postanovki na Uchjot (KPP) | Russia: KPP Number |
| RU4 | Kod Organizatchii v Organe Federal'nogo Kaznatchejstva (OFK) | Russia: OFK Number |
| SE0 | Momsregistreringsnummer (Moms Reg. Nr.) | Sweden: VAT Registration Number |
| SE2 | Organisationsnummer | Sweden: Organization Registration Number |
| SG1 | GST Registration Number | Singapore: GST Registration Number |
| SI0 | identifikacijska številka za DDV | Slovenia: VAT Registration Number |
| SI1 | davčna številka | Slovenia: Tax Number |
| SK0 | Identifikačné číslo pre daň (IČ DPH) | Slovakia: VAT Registration Number |
| SK1 | Daňové identifikačné číslo (DIC) | Slovakia: DIC Number |
| SK2 | Identifikačné číslo organizácie (ICO) | Slovakia: ICO Number |
| TH1 | Personal Identification Number (เลขประจำตัวผู้เสียภาษีอากร ประเภทบุคคลธรรมดา) | Thailand: Personal ID |
| TH2 | Registered Tax Identification Number (เลขประจำตัวผู้เสียภาษีอากร) | Thailand: Tax ID |
| TR1 | | Turkey: Tax Office |
| TR2 | vergi numarasi | Turkey: Tax Number |
| TW1 | Tong Yi Bian Hao | Taiwan: GUI Registration Number |
| TW2 | Shuei Ji Bian Hao | Taiwan: Tax Registration Number |

-continued

| Code | Name | Description |
|---|---|---|
| UA1 | Individualnij Nalogovyj Numer (INN) индивидуальных номеров налогоплательщиков (ИНН) | Ukraine: INN |
| UA2 | Identifikatsionnyj kod platelschika po Edinomu Gosudarstvennomu Reestru Predprijatij i Organizhatsij Ukrainy (EGRPOU) | Ukraine: EDRPOU Number |
| UA3 | Identifikatsionnyj kod platelschika po Gosudarstvennomu Reestru Fizhicheskih Lits (GRFL) Державного реєстру фізичних осіб (код ДРФО) | Ukraine: DRFO Number |
| UA4 | Identifikatsionnyj kod platelschika dlja Sovmestnyh Predprijatij (SP) | Ukraine: Joint Venture Registration Number |
| US1 | Social Security Number | United States: Social Security Number |
| US2 | Employer Identification Number | United States: Employer ID Number |
| VE1 | Registro identificación fiscal (RIF) | Venezuela: RIF Number |
| VE2 | Número identificación tributaria (NIT) | Venezuela: NIT Number |

The data type may be used in conjunction with the tax number.

(vvvvvvvvv) TestDataIndicator

The GDT TestDataIndicator 35700 indicates whether the specified data is test data or not. An example (instance) for the GDT TestDataIndicator 35700 is:

<TestDataIndicator>true</TestDataIndicator>.

The GDT TestDataIndicator 35700 is depicted in FIG. 357. For the GDT TestDataIndicator 35700, the Category is Element 35702, the Property term is Test Data 35704, the Representation/Association term is Indicator 35706, the Type term is CCT 35708, and the Type Name term is Indicator 35710.

In an embodiment, the TestDataIndicator may include the following values:

| | |
|---|---|
| 'true' | The specified data is test data |
| 'false' | The specified data is not test data |

The TestDataIndicator may be used as part of the BusinessDocumentMessageHeader to display whether the data contained in the message is test data or not. The context of an interface may describe the business meaning of the 'true' and 'false' values of the TestDataIndicator.

(wwwwwww) UserAccountID

The GDT UserAccountID 35800 is a unique identifier for a system's user account. An example (instance) for the GDT UserAccountID 35800 is:

<UserAccountID>smith</UserAccountID>.

The GDT UserAccountID 35800 is depicted in FIG. 358. The GDT UserAccountID 35800 includes attributes schemeAgencyID 35814 and schemeAgencySchemeAgencyID 35832. For the GDT UserAccountID 35800, the Object Class term is User Account 35802, the Property term is Identification 35804, the Representation/Association term is Identifier 35806, the Type term is CCT 35808, the Type Name term is Identifier 35810, and the Length is from one to two hundred fifty-five 35812.

For the schemeAgencyID 35814, the Category is Attribute 35816, the Object Class term is IdentificationSchemeAgency 35818, the Property term is Identification 35820, the Representation/Association term is Identifier 35822, the Type term is xsd 35824, the Type Name term is token 35826, and the Length is from one to sixty 35828. The cardinality between the schemeAgencyID 35814 and the GDT UserAccountID 35800 is either zero or one 35830.

For the schemeAgencySchemeAgencyID 35832, the Category is Attribute 35834, the Object Class term is IdentificationSchemeAgency 35836, the Property term is SchemeAgency 35838, the Representation/Association term is Identifier 35840, the Type term is xsd 35842, the Type Name term is token 35844, and the Length is three 35846. The cardinality between the schemeAgencySchemeAgencyID 35832 and the GDT UserAccountID 35800 is either zero or one 35848.

SchemeAgencyID identifies the system that defined the identifier. SchemeAgencySchemeAgencyID may be mutually defined.

b) Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

A list of entities that are contained in the illustrative business object model, along with a description of each of these entities, is provided below. The entities that do not have a corresponding global data type may be derived from the global data type of a related entity. For example AddressCommunication and AddressOffice are defined within and can be derived from the Address global data type. This is easily discernable from the global data type previously described.

| Entity | Definition | Global Data Type |
|---|---|---|
| Accounting Cancellation | ACCOUNTINGCANCELLATION is the complete cancellation of posting information previously sent to Accounting. | |

-continued

| Entity | Definition | Global Data Type |
|---|---|---|
| Address | ADDRESS contains structured information about the types of addresses. This information includes details about addressees, the postal address, and the physical location and communication connections. | Address |
| Address Communication | ADDRESSCOMMUNICATION contains details about the ways of contacting a person or organization. | |
| AddressGeo Coordinates | ADDRESSGEOCOORDINATES contain the geographical data, in other words longitude and latitude specified as per the WGS84 reference system, which enables you to determine a position on the globe. | GeoCoordinates |
| AddressOffice | ADDRESSOFFICE contains details that describe the working environment of a contact person as well as details for addressing or identifying this person within the organization. | |
| AddressPerson Name | ADDRESSPERSONNAME contains the parts of a legal person's name. | PersonName |
| Address Physical Address | ADDRESSPHYSICALADDRESS contains the postal address data of a physical location. | |
| Attachment | An ATTACHMENT is a document of arbitrary type that is assigned to an interface object as an attachment. | Attachment |
| BTD Accounting ObjectSet | BTDAccountingObjectSet is a set of different account assignment objects. An account assignment object is a business object to which changes in value from business transactions are assigned in accounting. | AccountingObject Set |
| BTD Attachment | An ATTACHMENT is a document of arbitrary type that is assigned to a BUSINESSTRANSACTIONDOCUMENT or a BTDITEM as an appendix. | Attachment |
| BTD AttachmentWeb Address | A BTDInternalAttachmentWebAddress is a Web address for a document of any type that is assigned to a BUSINESSTRANSACTIONDOCUMENT or a BTDITEM as an attachment. | AttachmentWeb Address |
| BTDBidder Party | A BTDBidderParty is a party that bids for goods or services. | Business Transaction DocumentParty |
| BTDBidder PortalProvider Party | A BTDBidderPortalProviderParty is a party that runs a portal that brings business partners together for a business transaction. | BTDParty |
| BTDBillFrom Party | A BTDBillFromParty is the company or person executing the invoicing process for a product or service. | Business Transaction DocumentParty |
| BTDBillTo Party | A BTDBillToParty is the company or person to which/whom the invoice is to be sent for deliveries received or services provided. | Business Transaction DocumentParty |
| BTDBuyerParty | A BTDBuyerParty is the company or person authorizing the deliveries or services. | Business Transaction DocumentParty |
| BTDBuyer Product Catalogue Reference | A BTDBuyerProductCatalogueReference is a reference to a product catalog of a buyer or to an item within such a catalog. | Catalogue Reference |
| BTDCarrier Party | A BTDCarrierParty is the company or person that transports the goods. | Business Transaction DocumentParty |
| BTDCash DiscountTerms | BTDCASHDISCOUNTTERMS are payment conditions for goods and services. | CashDiscount Terms |
| BTDCash DiscountTerms Maximum Discount | BTDCashDiscountTermsMaximumDiscount is the maximum cash discount in the context of payment conditions that is granted during a sales transaction when payment takes place within a certain number of days after the baseline date for payment has passed. | CashDiscount |
| BTDCash DiscountTerms Normal Discount | BTDCashDiscountTermsNormalDiscount is the usual cash discount in the context of payment conditions that is granted during a sales transaction. | CashDiscount |
| BTDCatalogue ProviderParty | A BTDCATALOGUEPROVIDERPARTY is a party that compiles a catalogue. | Business Transaction DocumentParty |
| BTD Confirmation Description | BTDConfirmationDescription is a text in natural language which is visible for parties and is related to a confirmation. | Description |
| BTDConfirmed Price | A BTDCONFIRMEDPRICE is a price which has been confirmed. | |

-continued

| Entity | Definition | Global Data Type |
|---|---|---|
| BTDContract Release AuthorisedParty | The BTDContractReleaseAuthorisedParty is a party that is authorized to effect releases from a purchasing contract. | BTDParty |
| BTDCreation Log | BTDCreationLog is a sequence of log messages about the creation of a BusinessTransactionDocument. | |
| BTDCreation LogItem | BTDCreationLogItem is a log message about the creation of a BusinessTransactionDocument. | LogItem |
| BTDCredit AgencyReport Scoring | A BTDCreditAgencyReportScoring is the result of the rating of a party with regard to their creditworthiness using a scorecard specified by a credit agency. A scorecard is a schema for rating a party using different characteristics. | CreditAgency ReportScoring |
| BTDCredit Limit | BTDCREDITLIMIT is the credit limit valid for a business partner for a specific period of validity. | |
| BTDCreditor Party | A BTDCreditorParty is a party that, due to an obligation, is authorized to claim goods, services or payment. | Business Transaction DocumentParty |
| BTDCredit Rating | BTDCREDITRATING is the score determined by a credit agency or a credit management for a party for a specific period of validity. | |
| BTDCreditRisk Class | BTDCREDITRISKCLASS is the risk class of a party determined by a credit agency or a credit management for a party for a specific period of validity. | |
| BTDDebtor Party | A BTDDebtorParty is a party that, due to an obligation, is obliged to provide goods, services or payment. | Business Transaction DocumentParty |
| BTDDelivery Control | The BTDDeliveryControl is the set of internal controlling delivery parameters for one or more requested deliveries in a delivery process. | |
| BTDDelivery Reference | A BTDDeliveryReference is a reference to a delivery (delivery note ID) or to an item within a delivery. | Business Transaction Document Reference |
| BTDDelivery Terms | The BTDDeliveryTerms are the conditions and agreements that are to be valid for executing the delivery and transporting the ordered goods and for the necessary services and activities. | DeliveryTerms |
| BTDDelivery Terms Description | A BTDDeliveryTermsDescription is a text in natural language for specification of legible additional information for delivery terms. | Description |
| BTDDelivery TermsIncoterms | BTDDeliveryTermsIncoterms are commercial contract formulae for the delivery conditions that correspond with the rules compiled by the International Chamber of Commerce (ICC). | Incoterms |
| BTDDelivery TermsPartial Delivery | BTDDeliveryTermsPartialDelivery is the maximum number of partial deliveries that may/can be carried out to deliver the ordered quantity of an item. | PartialDelivery |
| BTDDelivery TermsQuantity Tolerance | BTDDeliveryTermsQuantityTolerance is the tolerated difference between a requested and an actual quantity (for example, a delivery quantity) as a percentage. | Quantity Tolerance |
| BTDDelivery TermsTransport | BTDDeliveryTermsTransport provides information for the transport of goods. This includes, for example, speed of delivery, the way of doing the transport, the transportation mode, and the transport category. | |
| BTD Description | BTDConfirmationDescription is a text in natural language which is visible for parties. | Description |
| BTD Despatched Delivery Notification Reference | A BTDDespatchedDeliveryNotificationReference is the reference to a shipping notification. | Business Transaction Document Reference |
| BTDFollowUp BillingDue Notification | The BTDFollowUpBillingDueNotification is information about whether an invoice is to be created during the subsequent process and whether the delivery data is required for invoice creation. | |
| BTDFollowUp Despatched Delivery Notification | The BTDFollowUpDespatchedDeliveryNotification is information about how and if the buyer would like to be informed by the seller of a delivery and specifies if an advanced shipping notification (ASN) is expected or is to be sent. | |
| BTDFollowUp InvoiceRequest | BTDFollowUpInvoiceRequest is information about whether the buyer expects to receive an invoice from the seller. | |
| BTDFollowUp InvoicingDue Notification | The BTDFollowUpInvoicingDueNotification is information about whether an invoice is expected during the subsequent process and if the delivery data is required for invoice verification. | |

-continued

| Entity | Definition | Global Data Type |
|---|---|---|
| BTDFollowUp Purchase Contract | A BTDFollowUpPurchaseContract is information about whether the buyer expects a purchase contract as the result of the request for quotation process. | |
| BTDFollowUp PurchaseOrder | A BTDFollowUpPurchaseOrder is information about whether the buyer expects a purchase order as a result of the request for quotation process. | |
| BTDFollowUp PurchaseOrder Confirmation | BTDFollowUpPurchaseOrderConfirmation is information about whether and in what form the buyer expects to receive confirmation of the purchase order from the seller. | |
| BTDFollowUp Purchasing Contract | A BTDFollowUpPurchasingContract is information about whether the buyer expects a purchase contract as the result of the request for quotation process. | |
| BTDFollowUp SalesOrder Fulfillment Confirmation | A BTDFollowUpSalesOrderFulfillmentConfirmation is information about whether the seller expects a confirmation of a SalesOrderFulfillment from the procurement planning component. | |
| BTDFollowUp Service Acknowledgement Request | BDFollowUpServiceAcknowledgementRequest is information about whether the buyer wants to be informed by the seller of any services provided. | |
| BTDHandling Unit | BTDHandlingUnit is a physical unit of packaging materials (load carrier, additional packaging materials) and the packaged products (of type "Material"). | HandlingUnit |
| BTDIBatch | BTDIBatch is a batch with its properties. A batch is a non-reproducible, homogeneous subset of a product. The subset's chracteristics lie within the batch characteristics defined for the product. | Batch |
| BTDI Consignment Inventory | BTDConsignmentInventory is the consignment store stock of a product; in other words, the part of the stock that remains the property of the vendor until it is procured (and paid for). | |
| BTDIInventory | BTDInventory is the warehouse stock of a product. | |
| BTDInbound Delivery Reference | BTDDeliveryReference is the reference to an incoming delivery or one of its items. | Business Transaction Document Reference |
| BTDInternal AttachmentWeb Address | A BTDInternalAttachmentWebAddress is a Web address for a document of any type that is assigned to a BUSINESSTRANSACTIONDOCUMENT or a BTDITEM as an attachment. It is not visible for parties. | AttachmentWeb Address |
| BTDInternal Description | A BTDINTERNALDESCRIPTION is a text in natural language which is not visible for external parties. It is intended for internal use only. | Description |
| BTDInvoice Reference | A BTDInvoiceReference is the reference to the invoice of the invoicing party. | Business Transaction Document Reference |
| BTDI Preferential Statement | A BTDIPreferentialStatement is the legally binding statement of vendors on goods they have delivered, which allows the buyer to claim customs tariff preferences for these goods. | |
| BTDI Preferential Statement NonPreferential Product Constituent | A NonPreferentialProductConstituent is a specification on parts or precursor materials of a product for which no customs tariff preferences can be claimed. | |
| BTDIPrevious Release | A BTDIPreviousRelease is a statement about the identification and validity of the last release instance previously transferred in a delivery schedule. | |
| BTDIPromotion | A BTDIPromotion is a marketing activity between the consumer goods industry and retail over a limited time frame to increase brand capital, name recognition, and market share, to boost sales volumes, or to position new products or product groups. | |
| BTDIRelease | A BTDIRelease is a statement about the identification and validity of a release instance transferred in a delivery schedule item. | |
| BTDItem | BTDITEM is an Item of a BusinessTransactionDocument. In general it describes a product or subject of business activities. Quantities and/or dates are specified by means of the BTDItemScheduleLine. | |

-continued

| Entity | Definition | Global Data Type |
|---|---|---|
| BTDItem Confirmed ScheduleLine | A BusinessTransactionDocumentItemScheduleLine is a confirmed subdivision of items of a business transaction document according to dates and the product quantity associated with each date. | PurchaseOrder ItemScheduleLine SalesOrder FulfillmentItem ScheduleLine |
| BTDItem Hierarchy Relationship | BTDHierarchyRelationship is the relationship between a subitem and a higher-level parent item in an item hierarchy. | |
| BTDItem ScheduleLine | A BusinessTransactionDocumentItemScheduleLine is a subdivision of items of a business transaction document according to dates and the product quantity associated with each date. | PurchaseOrder ItemScheduleLine SalesOrder FulfillmentItem ScheduleLine |
| BTDItem ScheduleLine DeliveryPeriod | The BTDItemScheduleLineDeliveryPeriod is the date or the period for the delivery of goods or the provision of services. | DateTimePeriod |
| BTDLegal Document Attachment | A LegalDocumentAttachment is an attachment that contains the legal text of a business transaction document. | Attachment |
| BTDLegal Event | A BTDLEGALEVENT is a legal transaction or a legal event. | |
| BTDLoan Amortizement Condition | A BTDLoanAmortizementCondition is a repayment condition for a loan. It regulates the conditions to which a loan is to be repaid. | Loan Amortizement Condition |
| BTDLoanFee Condition | A BTDLoanFeeCondition is the fee condition for a loan. | LoanFee Condition |
| BTDLoan Interest Condition | A BTDLoanInterestCondition is a condition for calculating the interest on a loan. | LoanInterest Condition |
| BTDLoan PaymentPlan | A BTDLoanPaymentPlan contains the planned payments for a loan. | |
| BTDLoan PaymentPlan Item | A BTDLoanPaymentPlanItem is a payment planned for a key date for a loan. | LoanPaymentPlan Item |
| BTDLocation | A BusinessTransactionDocumentLocation contains the information that is exchanged in business documents about a location relevant for business transactions. These specifications contain the identification of the location and its address. The identification may be a company-internal ID, a standardized ID, or one or several partner-specific IDs. A location is a logical or a physical place. | Business Transaction Document Location |
| BTDLocation Address | A BTDLocationAddress assigns an address to a BTDLocation. | |
| BTD Manufacturer Party | A ManufacturerParty is a party that manufactures goods. | Business Transaction DocumentParty |
| BTDNet PurchasePrice | The BTDNetPurchasePrice refers to the net purchase price specified by the requester or the buyer (relating to the quantity ordered) for the product or service. This price forms the basis for order optimizing in the planning system. | Price |
| BTD Operational Purchasing Contract Reference | The BTDOperationalPurchasingContractReference is the reference to an operational purchasing contract or to an item within an operational purchasing contract. | Business Transaction Document Reference |
| BTDOrigin Invoice Reference | A BTDOriginInvoiceReference is a reference to an origin invoice. | Business Transaction Document Reference |
| BTDOrigin PrimaNota Reference | BTDOriginPrimaNotaReference is the reference to the origin document of the sender on which posting information previously sent to Accounting - and now to be cancelled - is based. | Business Transaction Document Reference |
| BTDOrigin PurchaseOrder Reference | A BTDOriginPurchaseOrderReference is a reference to an origin purchase order or to an item within an origin purchase order. | Business Transaction Document Reference |
| BTDOrigin VendorInvoice Reference | A BTDOriginVendorInvoiceReference is the reference to an origin vendor invoice. | Business Transaction Document Reference |
| BTDOwner Party | An BTDOwnerParty is a party that has tangible or intangible commodity as property. | Business Transaction DocumentParty |

-continued

| Entity | Definition | Global Data Type |
| --- | --- | --- |
| BTDParty | A BusinessTransactionDocumentParty contains the information that is exchanged - in accordance with common business understanding - in business documents about a party involved in business transactions.<br>This information is used to identify the party and the party's address, as well as the party's contact person and the contact person's address.<br>This identification can take place using an internal ID, a standardized ID, or IDs assigned by the involved parties. | Business Transaction DocumentParty |
| BTDParty Address | A BTDPartyAddress assigns an address to a BTDParty. | Address |
| BTDParty ContactPerson | A BTDPARTYCONTACTPERSON is a contact person of a party. A ContactPerson is a natural person who acts as a contact person during the processing of business processes. The ContactPerson includes details of the ContactPerson's identification as well as the ContactPerson's address. Identification can take place using an internal ID and using ID's assigned by the involved parties. | Business Transaction DocumentParty |
| BTDParty ContactPerson Address | A BTDPartyContactPersonAddress assigns an address to a BTDPartyContactPerson. | |
| BTDPayeeParty | A BTDPayeeParty is a party that receives a payment for goods or services. | Business Transaction DocumentParty |
| BTDPayerParty | A BTDPayerParty is a party that pays for goods or services. | Business Transaction DocumentParty |
| BTDPayment Form | A BTDPAYMENTFORM is the way in which, for example, goods or services are paid for. | |
| BTDPayment FormPayment Card | A BTDPAYMENTFORMPAYMENTCARD is an identification card suited for a certain payment form. It authorizes the holder to settle invoices without cash with contract companies connected to the payment system. | PaymentCard |
| BTDPending Delivery Reference | PendingDeliveryReference is the reference to an item in a delivery that is to be executed or is expected. | Business Transaction Document Reference |
| BTDPortal ProviderParty | A BTDPortalProviderParty is a party that runs a portal that brings business partners together for a business transaction. | Business Transaction DocumentParty |
| BTDPrice | A BTDPrice is a remuneration for a product, which is valid for a base quantity, for a certain period and ship-to location, and which can be scaled according to quantity. | |
| BTDPrice Component | A BTDPriceComponent is a non-fiscal part of a price that was calculated for the quantity of a product. | PriceComponent |
| BTDPriceScale | A BTDPriceScale is a set of price scale lines arranged linearly in accordance with a scale (axis) base type. | |
| BTDPriceScale Line | A PriceScaleLine is the price of a product depending on the quantity. | |
| BTDPrice Specification Element | A BTDPriceSpecificationElement is the definition of a price, a discount or a surcharge that is dependent on a combination of properties and that is valid for a certain period of time. | PriceSpecification Element |
| BTDPrimaNota Reference | BTDPrimaNotaReference is the reference to the document of the sender which represents the cancellation request to Accounting. | Business Transaction Document Reference |
| BTD Procurement CostUpperLimit | A ProcurementCostUpperLimit is a cost upper limit for different types of procurement costs. | ProcurementCost UpperLimit |
| BTDProduct | A BusinessTransactionDocumentProduct contains the information that is exchanged - in accordance with common business understanding - in business documents about a product. These are the details for identifying a product, product type as well as the description of the product. This identification can take place using an internal ID, a standardized ID, or IDs assigned by the involved parties. | Business Transaction DocumentProduct |

-continued

| Entity | Definition | Global Data Type |
|---|---|---|
| BTDProduct Category | A BusinessTransactionDocumentProductCategory contains the information that is exchanged - in accordance with common business understanding - in business documents about a product category. It includes details for identifying the product category using an internal ID, a standard ID along with IDs assigned by involved parties. | Business Transaction DocumentProduct Category |
| BTDProduct RecipientParty | A BTDProductRecipientParty is a party to which goods are delivered or services are provided. | Business Transaction DocumentParty |
| BTDProduct Tax | A BTDProductTax is a tax that is incurred when products are purchased, sold, or consumed. | ProductTax |
| BTDProposed SellerParty | A ProposedSellerParty is a preferred party for selling goods or services. | BTDParty |
| BTDPurchase Order Reference | A BTDPurchaseOrderReference is a reference to a purchase order or item in a purchase order. | Business Transaction Document Reference |
| BTDPurchasing Contract Reference | A BTDPurchasingContractReference is a reference to a purchase contract or item in a purchase contract. | Business Transaction Document Reference |
| BTDQuote Reference | A BTDQUOTEREFERENCE is a reference to a quotation or item in a quotation. | Business Transaction Document Reference |
| BTDRequest ForQuotation Reference | A BTDRequestForQuotationReference is a reference to a request for quotation or item in a request for quotation. | Business Transaction Document Reference |
| BTDRequestor Party | A BTDRequestorParty is a party that requests the procurement of goods or services. | Business Transaction DocumentParty |
| BTDSales Contract Reference | A BTDSALESCONTRACTREFERENCE is a reference to a sales contract or item in a sales contract. | Business Transaction Document Reference |
| BTDSalesOrder Reference | A BTDSalesOrderReference is a reference to a sales order or item of a sales order. | Business Transaction Document Reference |
| BTDScheduling | A BTDSCHEDULING groups together time intervals in order to define a schedule, for example, for ordering, delivering, or picking up products. | |
| BTDScheduling Agreement Reference | A BTDSchedulingAgreementReference is a reference to a scheduling agreement or item in a scheduling agreement. | Business Transaction Document Reference |
| BTDSellerParty | A BTDSELLERPARTY is a party that sells goods or services. | Business Transaction DocumentParty |
| BTDSeller Product Catalogue Reference | A BTDSellerProductCatalogueReference is a reference to a seller product catalogue or item in a seller product catalogue. | Catalogue Reference |
| BTDService Acknowledgement Reference | A BTDServiceAcknowledgementReference is a reference to a service acknowledgement or item in a service acknowledgement. | Business Transaction Document Reference |
| BTDShipFrom Location | A BTDShipFromLocation contains the information that is exchanged in business documents about a location relevant for business transactions, and from where goods or services are shipped. These specifications contain the identification of the location, its address and, if necessary, a different loading location. The identification may be a company-internal ID, a standardized ID, or one or several partner-specific IDs. | Business Transaction DocumentShip FromLocation |
| BTDShipment Reference | A BTDShipmentReference is a reference to a shipment or item in a shipment. | Business Transaction Document Reference |

-continued

| Entity | Definition | Global Data Type |
|---|---|---|
| BTDShipTo Location | A BTDShipToLocation contains the information that is exchanged in business documents about a location relevant for business transactions, and to which goods or services are shipped. These specifications contain the identification of the location, its address and, if necessary, a different unloading location. The identification may be a company-internal ID, a standardized ID, or one or several partner-specific IDs. | Business Transaction DocumentShipTo Location |
| BTDTax AuthorityParty | A TaxAuthorityParty is a party that collects and manages taxes. | TaxAuthority Party |
| BTDTax OperatorParty | A BTDTaxOperatorParty is a party that processes tax affairs for a BTDTaxPayerParty. | BTDParty |
| BTDTaxPayer Party | A BTDTaxPayerParty is a party that is liable to tax. | BTDParty |
| BTDTransport Means | BTDTransportMeans is the description of a means of transport and also can include information for a more detailed identification. | TransportMeans |
| BTDTransport Tracking | BTDTransportTracking contains transport-related information that can be used for tracking deliveries, for example, in goods deliveries. | Transport Tracking |
| BTD Transshipment Location | A BusinessTransactionDocumentTransshipment Location contains the information that is exchanged in business documents about a relevant location for business transactions where goods are transshipped (unloaded and reloaded). This information identifies the location, its address, a loading location, and an unloading location. The identification may be a company-internal ID, a standardized ID, or one or more partner-specific IDs. | BTD Transshipment Location |
| BTDValidation Log | A BTDValidationLog is a series of log messages from the tax authority that is has received and validated a tax return for tax on sales/purchases. | |
| BTDValidation LogItem | A ValidationLogItem is a log message on the receipt and validation of a tax return for tax on sales/purchases. | LogItem |
| BTDVendor Party | A BTDVendorParty is a party which delivers goods or provides services. | Business Transaction DocumentParty |
| BTDVendor Product Category | A BTDVendorProductCategory is a company-specific or vendor-specific schedule line for a vendor's entire range of products (vendor subrange). The VendorProductCategory provides the vendor view. | Business Transaction Document ProductCategory |
| BusinessPartner | A BusinessPartner is a person, an organization, or a group of persons in which a company has a business interest. | |
| Business Transaction Document | A BUSINESSTRANSACTIONDOCUMENT is a document that occurs or is created in the context of a business transaction. It represents for a point in time information about<br>Planning<br>Execution/fulfillment<br>Negotiations or agreements<br>Flows of values or goods regarding the involved parties and products, or subjects of a business activity.<br>This can be planned information, targeted information, or actual information.<br>The BUSINESSTRANSACTIONDOCUMENT contains the structures required for business transactions. In general, the basic structure of a BUSINESSTRANSACTIONDOCUMENT is subdivided into items, which in turn are subdivided into schedule lines according to dates and the product quantity associated with each date. | |
| BuyerProduct Catalogue | A BUYERPRODUCTCATALOGUE is a product catalogue of a buyer. | |
| Catalogue | A Catalogue is a structured directory of Catalogue items. Each item represents an object, and provides information about it. The Catalogue consists of global-, model- and content information. The global information provides information relevant to the entire Catalogue. The model information defines the structure of the Catalogue content and the properties used to describe this content. Content information contains the items of the Catalogue and their structural | |

-continued

| Entity | Definition | Global Data Type |
|---|---|---|
| | assignment within the Catalogue structure. It also can be the confirmation whether the publication of a Catalogue or the deletion of an already published Catalogue was successful or not. | |
| Catalogue Content | A CatalogueContent specifies the list of business objects included in the catalogue, together with their relationships and descriptions according to the catalogue's schemas, and the views that are used to restrict the catalogue's information content for certain purposes. The Catalogue content specifies the items contained in the Catalogue and their classification (that is, their assignment to Catalogue sections). The items can be arranged by defining relationships with a specific semantics between them. Specific (usage-dependent) Catalogue views can be defined for a Catalogue. Such a view specifies a subset of the Catalogue structure and/or the Catalogue content. | CatalogueContent |
| Catalogue Content CatalogueItem | A CatalogueContentCatalogueItem specifies information about an object included and to be classified within the Catalogue, and in a way according to the Catalogue's schema. A CatalogueContentCatalogueItem can contain one or more Descriptions which describe the item. The item can be classified by one or more Classifications. Furthermore, it can contain one or more PropertyValuations valid for this item. | CatalogueItem |
| Catalogue Content CatalogueItem Classification | A CatalogueContentCatalogueItemClassification classifies an item by assigning it to a Section within one of the Catalogue's schemas which the item belongs to. | CatalogueItem Classification |
| Catalogue Content CatalogueItem Description | A CatalogueContentCatalogueItemDescription provides a description for an item in a locale (language). | Description |
| Catalogue Content CatalogueItem Property Valuation | A CatalogueContentCatalogueItemPropertyValuation specifies the value of a property that can be attributed to the object the item represents, according to one of the Catalogue schemas. | Property Valuation |
| Catalogue Content CatalogueItem Relationship | A CatalogueContentCatalogueItemRelationship specifies a relationship with certain semantics between any two Catalogue items. | CatalogueItem Relationship |
| Catalogue Content CatalogueView | A CatalogueContentCatalogueView defines a restricted subset of a Catalogue by specifying schemas, sections, Catalogue items and item relationship types to be included and properties to be excluded. A CatalogueContentCatalogueView can contain one or more CatalogueViewSchemas, CatalogueViewItems and CatalogueViewItemRelationshipTypes which specify schemas, items and item relationship types included in the view. In addition, a CatalogueContentCatalogueView can contain one or more CatalogueViewExcludedProperty which specify properties not included in the view. | CatalogueView |
| Catalogue Content CatalogueView Excluded Property | A CatalogueContentCatalogueViewExcludedProperty specifies a property that is not included in the Catalogue view. | CatalogueView ExcludedProperty |
| Catalogue Content CatalogueView Item | A CatalogueContentCatalogueViewItem specifies a Catalogue item to be included in the Catalogue view. | CatalogueView Item |
| Catalogue Content CatalogueView ItemRelationship Type | A CatalogueContentCatalogueViewItemRelationship Type specifies a Catalogue item relationship type. All Catalogue item relationships of this type are to be included in the Catalogue view. | CatalogueView ItemRelationship Type |
| Catalogue Content CatalogueView Schema | A CatalogueContentCatalogueViewSchema specifies a schema and a list of sections belonging to the schema that are to be included in a Catalogue view. A CatalogueContentCatalogueViewSchema is subdivided into one or more CatalogueViewSchemaSections which specify Sections included in the view. | CatalogueView Schema |

-continued

| Entity | Definition | Global Data Type |
|---|---|---|
| Catalogue Content CatalogueView SchemaSection | A CatalogueContentCatalogueViewSchemaSection specifies a Section of the referenced Catalogue schema to be included in the Catalogue view. | CatalogueView SchemaSection |
| Catalogue Model | A CatalogueModel describes and structures the catalogue content using systems of categories to group catalogue items and properties that can be attributed to the catalogue items or the categories themselves (or both). The CatalogueModel is the information concerning how the catalogue content is structured and defined. The CatalogueModel defines properties, their (technical) data types and allowed values, which are used to describe Catalogue sections and/or the items contained in the Catalogue. Additionally the CatalogueModel specifies one or more schemas, which define the structural composition of the Catalogue content by means of sections and relationships between these sections. The Sections of a schema are a dividing up of Catalogue items and they specify properties which are used to describe the items assigned to the section. Schemas are defined for a specific purpose. Therefore, multiple schemas for one Catalogue can exist. | CatalogueModel |
| Catalogue Model CatalogueItem Property | A CatalogueModelCatalogueItemProperty specifies a property pertaining to each catalogue item together with its position in the full list of properties attributed to a catalogue item. | |
| Catalogue Model Catalogue Schema | A CatalogueModelCatalogueSchema defines a structural composition of the Catalogue content regarding a certain purpose. A CatalogueModelCatalogueSchema can contain one or more ItemProperty for the description of catalogue items of this schema. In addition, a Schema is subdivided into one or more Sections and SectionRelationships which define its structure. | CatalogueSchema |
| Catalogue Model Catalogue Schema CatalogueItem Property | A CatalogueModelCatalogueSchemaCatalogueItem Property specifies a property pertaining to a Catalogue item together with its position in the full list of properties attributed to a Catalogue item. | Property |
| Catalogue Model Catalogue Schema Catalogue Section | A CatalogueModelCatalogueSchemaCatalogueSection is a dividing up of Catalogue items according to the schema. A section specifies properties which can be used to describe such Items. A CatalogueModelCatalogueSchemaSection can contain one ore more PropertyValuations which describe the section. In addition it can contain one or more ItemProperty for the description of catalogue items of this section. | |
| Catalogue Model Catalogue Schema Catalogue Section CatalogueItem Property | A CatalogueModelCatalogueSchemaSectionItem Property specifies a property pertaining to the Catalogue items (objects) belonging to the Section, together with the property's position in the full list of properties attributed to a Catalogue item. | Property |
| Catalogue Model Catalogue Schema Catalogue SectionProperty Valuation | A CatalogueModelCatalogueSchemaCatalogueSection PropertyValuation contains the value of a property that can be attributed to or is used to describe the Section according to its Section type. | Property Valuation |
| Catalogue Model Catalogue Schema Catalogue Section Relationship | A CatalogueModelCatalogueSchemaCatalogueSection Relationship specifies a connection between two catalogue sections within a Catalogue schema. | |

-continued

| Entity | Definition | Global Data Type |
|---|---|---|
| Catalogue Model Catalogue SectionType | A CatalogueModelCatalogueSectionType describes the nature of Catalogue sections by defining properties for the description of sections of this type. A CatalogueModelCatalogueSectionType can contain one or more SectionProperty for the description of sections of this type. | CatalogueSection Type |
| Catalogue Model Catalogue SectionType SectionProperty | A CatalogueModelCatalogueSectionTypeSectionProperty specifies a property pertaining to a Section type together with its position in the list of properties. This property has to be attributed to all sections of this Section type. | CatalogueSection TypeSection Property |
| Catalogue Model Property | A CatalogueModelProperty specifies a property and additional information for it that can be used to describe and differentiate between items contained or sections used within the Catalogue. | Property |
| Catalogue Model Property DataType | A CatalogueModelPropertyDataType defines the data type of properties (and information about its change) used in the Catalogue. | PropertyData Type |
| Catalogue ModelProperty DefinitionClass | A CatalogueModelPropertyDefinitionClass defines the scope of properties used in the Catalog. | Property DefinitionClass |
| Catalogue Provider Property Valuation | A CatalogueProviderPropertyValuation valuates properties provided by the Catalogue provider to provide additional information about the Catalogue (e.g., any information about the vendor's, Catalogue creation date, or Note.). | Property Valuation |
| Catalogue Publication | A CataloguePublication is a new, changed or deleted catalogue for publishing. | Transmission Catalogue |
| Catalogue Publication Confirmation | A CataloguePublicationConfirmation is the confirmation whether the publication of a Catalogue or the deletion of a (published) Catalogue was successful or not. | Catalogue Publication Confirmation |
| Catalogue Publication Transmission | A CATALOGUEPUBLICATIONTRANSMISSION is information concerning the transmission of a catalogue publication. This can be information about the reception of a package of the catalogue publication transmission and the validity of its content or the request to cancel the transmission of a catalogue publication or the confirmation of such a request or the request to lock single items of a catalogue publication transmission or the confirmation of such a lock request. | |
| Catalogue Publication Transmission Cancellation Confirmation | The CataloguePublicationTransmissionCancellation Confirmation is the confirmation whether the transmission of a Catalogue has been cancelled successfully and an earlier published state of this catalogue (if such exists) has been restored or not. The entity CataloguePublicationTransmission contains information about a catalogue | Catalogue Publication Transmission Cancellation Confirmation |
| Catalogue Publication Transmission Cancellation Request | A CataloguePublicationTransmissionCancellationRequest is the request to cancel the transmission of a Catalogue and to restore an earlier published state (if such exists) of the Catalogue. Moreover, no more packages are sent for this transmission. | Catalogue Publication Transmission Cancellation Request |
| Catalogue Publication Transmission ContentChange Confirmation | A CataloguePublicationTransmissionContentChange Confirmation is the confirmation of Catalog Search Engine (the publishing system) to Catalog Authoring whether a limited number of catalog items contained in the catalog publication transmission could be changed, created or deleted as requested by a CataloguePublicationTransmissionContentChange Request or not. | |
| Catalogue Publication Transmission ContentChange Request | A CataloguePublicationTransmissionContentChange Request is the request of Catalog Authoring to Catalog Search Engine to change, create or to delete a limited number of catalog items contained in the catalog publication transmission. | |
| Catalogue Publication Transmission ItemLock Confirmation | A CataloguePublicationTransmissionItemLock Confirmation is the confirmation whether single items of the catalogue contained in the catalogue publication transmission could be locked or not. To lock means: If the catalogue is not yet published the items must not be published. If the catalogue is already published, the publication of these items must be revoked. | Catalogue Publication TransmissionItem Lock Confirmation |

-continued

| Entity | Definition | Global Data Type |
|---|---|---|
| Catalogue Publication Transmission ItemLock Request | A CataloguePublicationTransmissionItemLockRequest is the request to lock single items of the catalogue contained in the catalogue publication transmission. To lock means: If the catalogue is not yet published the items must not be published. If the catalogue is already published, the publication of these items must be revoked. | Catalogue Publication TransmissionItem LockRequest |
| Catalogue Publication Transmission Package | A CataloguePublicationTransmissionPackage specifies a package of a Catalogue publication transmission and information about the reception of this package and the validity of its content. | Catalogue Publication Transmission Package Transmission |
| Catalogue Update | A CatalogueUpdate is a new, changed or deleted catalogue. | Catalogue |
| CreditAgency Report | A CREDITAGENCYREPORT is the credit information issued by the credit agency for a party. CREDITAGENCYREPORT contains the credit information required about a party, with details about the creation of this information. | CreditAgency Report |
| CreditAgency ReportQuery | A CREDITAGENCYREPORTQUERY is the query to a credit agency for credit information about a party. CREDITAGENCYREPORTQUERY contains details about the party for whom credit information is required, together with a specification of the service required by the agency. | CreditAgency ReportQuery |
| CreditAgency ReportQuery Service | A CREDITAGENCYREPORTQUERYSERVICE specifies the type and scope of the service required from the credit agency. | |
| Credit Worthiness | CREDITWORTHINESS specifies the creditworthiness of a business partner, if required with details of the score, risk class, and credit limit. | CreditWorthiness |
| Credit Worthiness Query | A CREDITWORTHINESSQUERY is the query regarding the creditworthiness of a business partner. | CreditWorthiness Query |
| Cumulative Delivery | A CumulativeDelivery contains the cumulated quantities of all the deliveries for a product in the specified validity period. | |
| CustomsVendor Declaration | A CustomsVendorDeclaration is the legally binding declaration of the vendors concerning the goods they delivered to a buyer which allows the buyer to claim customs tariff preferences. A vendor declaration can be made as an individual declaration for an individual delivery or as a long-term declaration that is, in general, valid for one year. | |
| CustomsVendor DeclarationItem | A CustomsVendorDeclarationItem is the summary of all the specifications that vendors make in the CustomsVendorDeclaration on a product they deliver. | |
| Delivery | A Delivery is a collection of goods that is to be staged for shipment or is to be received - after shipment - for further use within a company. Delivery specifies when and where certain quantities of products are delivered. It also may inform about the status of execution of a delivery. | Delivery |
| Delivery Execution Period | A DELIVERYEXECUTIONPERIOD is the planned or current period or time at which a particular step of the delivery process is to be completed or has been completed. | |
| Delivery Execution Request | A DeliveryExecutionRequest is a request to supply chain execution (Logistics, the warehouse) to stage goods and to deliver them or prepare goods arrivals and receive incoming goods. DeliveryExecutionRequest contains request items with the requested products, partners, locations, and schedule lines. This specifies when and where, and by whom, products are to be staged and delivered (from and to) and received. | Delivery ExecutionRequest |
| Delivery Execution RequestItem | A DeliveryExecutionRequestItem is the part of a delivery request that contains an actual product, its quantities, and dates as well as the location to which the product is to be delivered. | Delivery ExecutionRequest Item |
| Delivery ExecutionStatus | A DELIVERYEXECUTIONSTATUS specifies the type and execution status of delivery processing reached for all the items or the delivery as a whole. | |
| Delivery Information | A DeliveryInformation is a message about the creation of a delivery, changes made to a delivery, and the execution status of a delivery. DeliveryInformation is divided into delivery items (DeliveryItems), which | |

-continued

| Entity | Definition | Global Data Type |
|---|---|---|
| | describe the execution status and execution period for delivering a particular quantity of a product or batch. References to relevant business documents can be specified for a delivery item. For the delivery as a whole, the ship-from/to location, shipment details, and references to any relevant business documents can be specified alongside the delivering party, recipient, and shipping party. | |
| Delivery Information Item | A DeliveryInformationItem is a quantity of a product in the delivery and contains additional information about its delivery processing status along with any references to previous business documents. | |
| DeliveryItem | A DELIVERYITEM is an item that specifies a quantity of a product to be delivered and contains additional information about its delivery processing status along with any references to previous business documents. | DeliveryItem |
| DeliveryItem Variance | DeliveryItemVariance describes a variance in the received quantity of a product and type of and reason for the variance. | |
| Delivery Schedule | A DeliverySchedule is a tool that is used by a customer to notify a vendor about the quantity of a material from a scheduling agreement item that is to be delivered and at what time. | |
| Delivery ScheduleItem | DeliveryScheduleItem is a statement regarding the requirement for a specific product at a ship-to location with reference to a scheduling agreement ("Scheduling Agreement"). | |
| Despatched DeliveryItem | DespatchedDeliveryItem describes what quantity of a product is to be delivered/picked up. | |
| Despatched Delivery Notification | A DespatchedDeliveryNotification is a notice for a goods recipient about the planned arrival/pickup/issue date for a ready-to-send delivery including details about the contents of the delivery. In general, a DespatchedDeliveryNotification contains several items, which refer to the specifications for the quantity, weight, and volume for each delivered product, as well as preceding documents and/or outline agreements. | Despatched Delivery |
| Inbound Delivery | An InboundDelivery is an incoming delivery. | |
| Incoterms | Incoterms are commercial contract formulae for the delivery conditions that correspond with the rules compiled by the International Chamber of Commerce (ICC). | Incoterms |
| Inventory Change | InventoryChange summarizes changes in warehouse stock.<br>An InventoryChange consists of individual changes in warehouse stock which Accounting or Logistics Planning must be informed of. All of the stock changes summarized in a message are of the same transaction type (goods receipt, goods issue, physical stock, transfer posting, and so on). | InventoryChange |
| Inventory Change Accounting Cancellation | An INVENTORYCHANGEACCOUNTING CANCELLATION is the full cancellation of posting information previously sent to Accounting with respect to a goods movement. | |
| Inventory ChangeItem | An InventoryChangeItem is an individual warehouse stock change. | InventoryChange Item |
| Inventory ChangeItem Inbound | An InventoryChangeItemInbound characterizes a receipt of warehouse stock by means of the receiving location, receiving owner, received quantity, and received material. | InventoryChange ItemInbound |
| Inventory ChangeItem Outbound | An InventoryChangeItemOutbound characterizes an issue of warehouse stock by means of the ship-from location, issuing owner, issued quantity, and issued material. | InventoryChange ItemOutbound |
| Invoice | An Invoice is a binding request from an invoicing party (such as vendor) to an invoice recipient (such as a sold-to-party) to make payment for the type and quantity of products or services received as a result of previous business transactions by a predefined date. Invoice not only specifies the remuneration and tax to be paid by the participating business partners for products and services provided, but also gives detailed information about the payment conditions and delivery terms. | Invoice |

-continued

| Entity | Definition | Global Data Type |
|---|---|---|
| Invoice Accounting | An InvoiceAccounting is the preparation of an invoice or credit memo for Accounting. For an invoice or credit memo uniquely identified as the underlying business document, InvoiceAccounting contains item information about receivables and payables, taxes on sales and purchases, and expenses and revenues. In addition, the business partners involved are named. | Invoice Accounting |
| Invoice Accounting Cancellation | An INVOICEACCOUNTINGCANCELLATION is the full cancellation of posting information previously sent to Accounting for an incoming or outgoing invoice or credit memo. | |
| Invoice AccountingDue Item | An InvoiceAccountingDueItem is the information relevant for Accounting about receivables or payments from deliveries and services that are listed in an invoice or credit memo item. | Invoice AccountingDue Item |
| Invoice Accounting Expense RevenueItem | An InvoiceAccountingExpenseRevenueItem is the information relevant for Accounting about an expense or revenue that was listed in an invoice or credit memo item. | Invoice Accounting ExpenseRevenue Item |
| Invoice AccountingItem | An InvoiceAccountingItem is the information relevant for Accounting about an account receivable or payable from deliveries and services that are listed in an invoice or credit memo item. | |
| Invoice AccountingTax Item | An InvoiceAccountingTaxItem is the information relevant for Accounting about an account receivable or payable from taxes on sales and purchases that are listed in an invoice or credit memo item. | Invoice AccountingTax Item |
| InvoiceDue | An InvoiceDue summarizes the details regarding a business transaction that are relevant for settling (creating billing documents and checking and creating incoming invoices) this business transaction. InvoiceDue consists of InvoiceDueItems, which represent items of the base business document for the future settlement. An InvoiceDueItem usually consists of information about the quantity of a product that has been ordered or delivered, as well as the business partners, locations, terms of delivery and payment involved and the other business documents to be taken into account when the product is settled. | InvoiceDue |
| InvoiceDue Cancellation | An InvoiceDueCancellation is a request to exclude business document data that has already been sent from the settlement. | |
| InvoiceDueItem | An InvoiceDueItem summarizes the information from a business document item that is to be taken into account in the future settlement. An InvoiceDueItem usually consists of information about the quantity of a product that has been ordered or delivered, as well as the business partners, locations, terms of delivery and payment conditions involved, and the other business documents to be taken into account when the product is settled. | InvoiceDueItem |
| InvoiceIssued | An InvoiceIssued summarizes the invoice information relevant for contract management/sales. InvoiceIssued contains information about which order items, items in credit and debit memo requests or delivery items have been billed and to what extent. | InvoiceIssued |
| InvoiceIssued Item | An InvoiceIssuedItem specifies the quantity or the partial value of a product billed with respect to a business transaction. | InvoiceIssued Item |
| InvoiceItem | An InvoiceItem is part of an invoice containing the prices and taxes for the quantity of a product that has been delivered or for a service that has been provided. In addition, to the information about prices and taxes, InvoiceItem comprises information about the participating business partners, the payment conditions, and the delivery terms, if they differ from the information provided in the invoice header. | InvoiceItem |
| Loan Calculation | A LoanCalculation describes the results of a loan calculation. | |
| Loan Calculation Query | A LoanCalculationQuery describes the query requesting a loan calculation. It contains information about the loan to be calculated, loan conditions, and type of calculation to be made. | |

-continued

| Entity | Definition | Global Data Type |
|---|---|---|
| LoanContract | A LoanContract contains all of the information that is required for creating a loan contract. The loan is based on loan conditions. These define the interest rate, repayment, and fees. Structurally speaking the loan contract is made up as follows:<br>Description of parties to the contract (lender, borrower, and possibly PayerParty, LoanBrokerParty, and GuarantorParty).<br>Key loan attributes such as start and end of loan as well as reason for loan, and so on.<br>Payment information<br>Conditions (Interest, Repayment, Fees)<br>Fundamental agreements and documents such as general terms and conditions, financial statements, personal information, information about the financing object, collateral agreement. | |
| LoanContract Item | A LoanContractItem defines the conditions of a loan. Conditions can be:<br>Interest conditions<br>Repayment conditions<br>Fees | |
| Location | A location is a physical place. | |
| OrderID Assignment | An OrderIDAssignment represents an assignment of order numbers to a vendor/seller by a buyer or, more generally, to an agent by an ordering party. | |
| OrderID Assignment Item | An OrderIDAssignmentItem describes the order numbers that are permissible and should be used to identify orders created by the seller for a specific combination of delivery location, marketing promotion, and purchasing group at the buyer. | |
| Organisational Centre | Building block of the enterprise model, which represents a node in an organizational structure of the extended enterprise. It incorporates different business roles that are defined in detail by specializing the org centre into business characters. | |
| PaymentDue | PaymentDue indicates the type of due payments (for payment or expected) and their amounts. For each invoice or credit memo that is uniquely identified as the base business document, PaymentDue receives one or more due date items (PaymentDueItems) with details of the type and amount of the payment due, the payment terms and the business partners involved. | PaymentDue |
| PaymentDue Item | A PaymentDueItem describes a due date item (receivable or payable). PaymentDueItem can contain additional details on payment terms and participating business partners as well as the type and amount of payment due. | PaymentDueItem |
| Pending Delivery | A PENDINGDELIVERY is a planned delivery. | |
| PersonnelTime Sheet | PersonnelTimeSheet groups together the personnel times or personnel time events recorded for a personnel resource. The PersonnelTimeSheet includes one or more PersonnelTimeSubsheets, which contain the personnel times and personnel time events for one work agreement. | PersonnelTime Sheet |
| PersonnelTime Subsheet | A PersonnelTimeSubsheet is a set of personnel times and personnel time events that have been recorded during a particular period for a personnel resource regarding a work agreement. | PersonnelTime Subsheet |
| PersonnelTime Subsheet PersonnelTime | A PersonnelTimeSubsheetPersonnelTime is a period of a personnel resource that is characterized by business, pay scale, or legal criteria. | PersonnelTime |
| PersonnelTime Subsheet PersonnelTime Event | A personnel time event is a change in the execution of services of a personnel resource with which one personnel time ends and another personnel time begins. Such changes can include, for example, the start of work, interruption of work, or end of work. A personnel time event is characterized by a type such as "clock-in entry", "clock-out entry", or "start of break". | PersonnelTime Event |
| Previous Delivery | PreviousDelivery contains data about the physical delivery that was last received. | |
| Product | A product is a commodity that is the object of the business of a company and serves to create value for this company. A product can be tangible or intangible, | |

-continued

| Entity | Definition | Global Data Type |
|---|---|---|
| | and can contain other products or belong to another product (such as a set). A product can have relationships to other products or objects. For example, a service can exist for a product that is specially manufactured or financing for a particular category of products. | |
| ProductActivity | ProductActivity contains specifications about the stock, demand, and consumption of products of a buyer (retailers, wholesalers, or manufacturers) at a ship-to location, and about the involved parties, for other relevant business documents and (optionally) for a ship-from location. | ProductActivity |
| ProductActivity Item | A ProductActivityItem contains specifications about the stock, demand, and/or consumption of a product in reference to a ship-to location and (optionally) a ship-from location. | ProductActivity Item |
| Product Category | A product category is a division of products according to objective business-specific criteria. | |
| Product Category Hierarchy | A Product Category Hierarchy is a hierarchy for structuring product categories. Depending on the business context, products are assigned to categories and arranged in hierarchies in order to group similar products. | |
| ProductDemand Influencing Event | A ProductDemandInfluencingEvent describes a demand influencing event and its effects on the demand. A ProductDemandInfluencingEvent specifies event dates and participating business partners. It is divided up into items that each contain the effects of the event on the expected sales quantities with regard to a ship-to party location and a product. | |
| ProductDemand Influencing EventItem | A ProductDemandInfluencingEventItem specifies for a ship-from location (optional), a ship-to location, and a product the sales quantities expected on the basis of the demand influencing event in the form of a time series. | |
| ProductForecast | A ProductForecast is a forecast (or the revision of such a forecast) of the sale/demand of products in the form of time series between business partners. A ProductForecast consists of several items which can contain information about the sales quantities predicted by the forecast for each ship-to location and product. | ProductForecast |
| ProductForecast Item | A ProductForecastItem specifies (or revises) for a ship-from location (optional), a ship-to location, and a product the forecasted sales quantities in the form of a time series. | ProductForecast Item |
| ProductForecast Notification | A ProductForecastNotification is a notice about future product sales or demands (forecasts). | ProductForecast |
| ProductForecast Notification Item | A ProductForecastNotificationItem specifies for a ship-from location (optional), a ship-to location, and a product the forecasted sales quantities in the form of a time series. | ProductForecast Item |
| ProductForecast Revision | A ProductForecastRevision is a revision of a forecast of the sale/demand of products in the form of time series between business partners. A ProductForecastRevision consists of several items, which can contain information about the sales quantities predicted by the forecast for each ship-to location and product. | ProductForecast |
| ProductForecast RevisionItem | A ProductForecastRevisionItem specifies for a ship-from location (optional), a ship-to location, and a product the revision of the forecasted sales and purchase order quantities in the form of a time series. | |
| Property | A PROPERTY is an object attribute. | Property |
| PropertyData Type | PROPERTYDATATYPE is the data type of a property. It describes the syntax of the values and can contain a list of permitted values. | PropertyData Type |
| Property DefinitionClass | A PROPERTYDEFINITIONCLASS is a class for defining properties (in a classification system). | Property DefinitionClass |
| PurchaseOrder | A PurchaseOrder is a buyer's request to a seller to provide or deliver certain quantities of products at one or several dates. This can include a change (including confirmation or cancellation) of a purchase order or information about the status of the purchase order. The PurchaseOrder is divided into PurchaseOrderItems that each specify an ordered product or additional information relevant for such a product, such as information about bills of material (BOMs) or discount | |

-continued

| Entity | Definition | Global Data Type |
|---|---|---|
| | or value limits. In addition, to the buying party and the seller, additional parties can be involved in the PurchaseOrder. Locations can be specified for the purchase order delivery. Delivery and payment terms also are agreed. Notes or references to attachments can be specified for the PurchaseOrder. The types of follow-up documents that are expected with regard to the PurchaseOrder package also can be specified. | |
| PurchaseOrder Cancellation | A PurchaseOrderCancellation is a buying party's (buyer's) request to a provider (seller) to cancel a purchase order. | PurchaseOrder Cancellation |
| PurchaseOrder Change | A PurchaseOrderChange is a change made to the buyer's request to the seller to deliver goods or provide services. | PurchaseOrder |
| PurchaseOrder Confirmation | A PurchaseOrderConfirmation is a confirmation, partial confirmation, or a change sent from the seller to the buyer concerning the requested delivery of goods or provision of services. | PurchaseOrder |
| PurchaseOrder Information | A PurchaseOrderInformation is the information about the status of a purchase order. This includes a purchase order change, confirmation, or cancellation. | PurchaseOrder Information |
| PurchaseOrder Information Item | A PurchaseOrderInformationItem specifies a product ordered by the purchase order or additional information about ordered products. This information includes specifications on discounts in kind, substitute products, and value limits. The PurchaseOrderInformationItem contains detailed information about a particular product and its price. The quantity of the product and (delivery) dates are specified in the schedule line. For the PurchaseOrderInformationItem (compared to the information of the PurchaseOrderInformation), deviating parties, locations, and delivery terms can be defined. The PurchaseOrderInformationItem can contain references to other business documents that are relevant for the item. Notes or references to attachments also can be specified for the PurchaseOrderInformationItem. A PurchaseOrderInformationItem can be subordinate to another PurchaseOrderInformationItem within a hierarchy to represent a business relationship between the two items. This could be information about a discount in kind or substitute product for an ordered product, for example. This relationship also can be used to group together purchase order items; that is, a PurchaseOrderInformationItem can group together other PurchaseOrderInformationItems. | PurchaseOrder InformationItem |
| PurchaseOrder Item | A PurchaseOrderItem specifies a product ordered by the PurchaseOrder or additional information about such a product. This information includes specifications on discounts in kind, substitute products, and value limits. The PurchaseOrderItem contains detailed information about a particular product and its price. The quantity of the product and (delivery) dates are specified in the schedule line. For the PurchaseOrderItem (compared to the information of the PurchaseOrder), deviating parties, locations, and delivery terms can be defined. The PurchaseOrderItem can contain references to other business documents that are relevant for the item. Notes or references to attachments also can be specified for the item. A PurchaseOrderItem can be subordinate to another PurchaseOrderInformationItem within a hierarchy to represent a business relationship between the two items. This could be information about a discount in kind or substitute product for an ordered product, for example. This relationship also can be used to group together PurchaseOrder items; that is, a PurchaseOrderItem can group together other PurchaseOrderItems. | PurchaseOrder Item |
| PurchaseOrder Request | A PurchaseOrderRequest is a buyer's request to the seller to deliver goods or provide services. | PurchaseOrder |
| PurchaseOrder Update | A PurchaseOrderUpdate is a buyer's request to a seller to provide or deliver certain quantities of products on one or several dates. This can include a change or a confirmation of such a purchase order. | PurchaseOrder |

-continued

| Entity | Definition | Global Data Type |
|---|---|---|
| Purchase Requirement | A PurchaseRequirement is a requirement for procuring products (materials or services). The PurchaseRequirement is subdivided into PurchaseRequirementItems that each specify an ordered product or additional information relevant for such a product, such as information about product category or value limits. In addition, to the buying party and the seller as well as the proposed seller, additional parties can be involved in the PurchaseRequirement. Locations can be specified for the PurchaseRequirement delivery. | Purchase Requirement |
| Purchase Requirement Confirmation | A PurchaseRequirementConfirmation is a confirmation of the buyer that informs the requester of the extent to which a requisition has been fulfilled. | |
| Purchase Requirement Confirmation Item | A PurchaseRequirementConfirmationItem provides the extent to which an item of a requisition has been fulfilled. | Purchase Requirement ConfirmationItem |
| Purchase Requirement Confirmation ItemExecuting PurchaseOrder | A PurchaseRequirementConfirmationItemExecuting PurchaseOrder is information on a PurchaseOrderItem, which originates from a PurchaseRequirementItem. | |
| Purchase Requirement Item | A PurchaseRequirementItem specifies a product requested by the PurchaseRequirement or provides additional information about such a product. The PurchaseRequirementItem contains detailed information about a particular product and its price. The quantity of the product and (delivery) dates/times are specified in the schedule line. For the PurchaseRequirementItem (compared to the information of the PurchaseRequirement), deviating parties or locations can be defined. The PurchaseRequirementItem can contain references to other business documents that are relevant for the item. Notes or references to attachments also can be specified for the item. A PurchaseRequirementItem can be subordinate to another PurchaseRequirementItem within a hierarchy to represent a business relationship between the two items. This could be information about a substitute product for an ordered product, for example. This relationship also can be used to group together PurchaseRequirement items; that is, a PurchaseRequirementItem can group together other PurchaseRequirementItems. | Purchase RequirementItem |
| Purchasing Contract | A PurchasingContract is a framework agreement with a seller regarding the supply of products in acertain period of time. | |
| Purchasing ContractRelease | A PurchasingContractRelease (purchasing contract release) is a notification from purchasing to con-tract management regarding a performed release with reference to a purchasing contract. | |
| Purchasing ContractRelease Item | A PurchasingContractReleaseItem specifies a certain item in a PurchasingContractRelease item or provides additional information on such an item. This includes information on release quantities and release amounts. | |
| Quote | A Quote is a quotation submitted by a bidder to a buyer in response to a request for quotation (RFQ) issued for a product by the buyer. The Quote is subdivided into QuoteItems, which contain the concrete quotation submitted by the bidder with reference to the relevant item in the buyer's RFQ. | Quote |
| QuoteItem | A QuoteItem contains the bidder's quotation for a product tendered in an item of a request for quotation (RFQItem) or additional information about this product. Quantities and delivery dates also can be specified here. | QuoteItem |
| Received Delivery | A ReceivedDelivery is the detailed confirmation of the receipt of a delivery. | ReceivedDelivery |
| Received DeliveryItem | A ReceivedDeliveryItem describes which quantity of a product was received. | |
| Replenishment Order | A ReplenishmentOrder is an order that is planned by a vendor with the objective of replenishing products for a customer. | |

-continued

| Entity | Definition | Global Data Type |
|---|---|---|
| Replenishment OrderItem | A ReplenishmentOrderItem is an item in a replenishment order that is planned and executed by a vendor for his or her customer. The dates and quantities for delivering a certain product are described in the individual items and schedule lines. The business partners involved and (where applicable) references to other relevant business documents are also listed. | |
| Replenishment OrderProposal | A ReplenishmentOrderProposal is a proposal for a source location (for example, a vendor) to deliver certain quantities of products to a target location (goods recipient, for example, distribution center) at a spe-cific time, for replenishment purposes. | |
| Replenishment OrderProposal Item | A ReplenishmentOrderProposalItem groups all information, the type, quantity and dates for the products proposed for the replenishment purchase order. | |
| RequestFor Quotation (RFQ) | A RequestForQuotation (RFQ) is a request from a buyer to a bidder to submit a quotation for the products (goods or services) specified in the RFQ. This can include a change or a cancellation of such a RFQ. The RFQ is subdivided into RFQItems, which each contain a product specified for the RFQ or additional information for this product. In addition, to the buying party and the bidder, additional parties can be involved in the RFQ. The delivery location also can be specified. Delivery and payment terms also are agreed upon. The RFQ can contain a reference to a Quote if the bidder has a question or if the buyer has changed the RFQ. Notes or references to attachments can be specified for the RFQ. | |
| RequestFor QuotationItem | An RFQItem specifies a product tendered by an RFQ (request for quotation) with additional information on such a product. The RFQItem contains detailed information about a particular product. The quantity of the product and (delivery) dates/times are specified in the schedule line. For the RFQItem (compared to the information of the RFQ), deviating parties, locations, and delivery terms can be defined. The RFQItem can contain references to other business documents that are relevant for the item. Notes or references to attachments also can be specified for the RFQItem. An RFQItem can be subordinate to another RFQItem within a hierarchy in order to represent a business relationship between the two items. | RFQItem |
| RFQ Cancellation | An RFQCancellation is a cancellation of an RFQ (request for quotation) to a bidder by a buyer. | RFQCancellation |
| RFQChange | An RFQChange is a change to the buyer's request to a bidder to submit a quotation for the products (goods or services) specified in the RFQ (request for quotation). | RFQ |
| RFQRequest | An RFQRequest is a request from a buyer to a bidder to submit a quotation for the products (goods or services) specified in the RFQ (request for quotation). | RFQ |
| RFQResult | An RFQResult is the acceptance or the rejection of a bidder's quotation by the buyer. | RFQResult |
| RFQResultItem | An RFQResultItem specifies the rejection or the extent of the acceptance of a bidder's quotation for a product of an RFQ item. | RFQResultItem |
| RFQUpdate | An RFQ Update is a request (or a change to a request) from a buyer to a bidder to submit a quotation for the products (goods or services) specified in the RFQ (request for quotation). | RFQ |
| SalesContract | A SalesContract is a framework agreement with a customer concerning the supply of products in a certain period. | |
| SalesOrder | A SalesOrder is the request (or change or confirmation of such a request) to deliver certain quantities of products to a customer at one or several points in time. | |
| SalesOrder Fulfillment | A SalesOrderFulfillmentRequest is a request (or change and cancellation of such a request) to fulfill a sales order and in doing so to take into account the logistical requirements (availability check, scheduling, requirements planning, procurement, delivery, ...) of a sales order. The SalesOrderFulfillment is divided up into SalesOrderFulfillmentItems that each specify the product that is to be fulfilled or additional information for such a product such as BOM information. Alongside the purchasing party and the seller, other | SalesOrder Fulfillment |

-continued

| Entity | Definition | Global Data Type |
|---|---|---|
| | parties can be involved in the SalesOrderFulfillment. For the fulfillment of the SalesOrderFulfillment, locations can be determined and delivery methods can be agreed upon. Notes or references to attachments can be added to the SalesOrderFulfillment. Furthermore, it is possible to specify which types of follow-up documents are expected with regard to the SalesOrderFulfillment. | |
| SalesOrder FulfillmentItem | A SaleOrderFulfillmentItem specifies a product transferred by the SalesOrderFulfillment or additional information on such a product. The SalesOrderFulfillmentItem contains detailed information on a product and its batch. The quantity of the product and the (delivery) dates are specified in the schedule line. Deviating parties, locations and delivery methods can be specified for the SalesOrderFulfillmentItem (compared to the information of the SalesOrderFulfillment). The SalesOrderFulfillmentItem can contain references to other business documents that are relevant for the item. Furthermore, notes or references to attachments can be added. A SalesOrderFulfillmentItem can be subordinate to another SalesOrderFulfillmentItem within a hierarchy in order to represent a business connection between the two items. This might, for example, be the addition of a free-goods discount or a substitute product to an ordered product. | SalesOrder FulfillmentItem |
| Scheduling Agreement | SchedulingAgreement is an outline agreement between the customer and vendor that sets out the conditions regarding quantities, time periods and prices for the purchasing and delivery of goods. | |
| SellerProduct Catalogue | A SELLERPRODUCTCATALOGUE is a product catalogue of a seller. | |
| Service Acknowledgement | A ServiceAcknowledgement is a request from the seller asking the buyer to acknowledge a service that has been entered (or the buyer's acknowledgement of the entered service). The ServiceAcknowledgement is subdivided into ServiceAcknowledgementItems, each of which specifies a service that has been entered or additional information relevant for this service, such as hierarchy information. In addition, to the buyer and seller, other parties can participate in the ServiceAcknowledgement. Locations can be defined for entering the ServiceAcknowledgement. Notes or references to attachments can be included in the ServiceAcknowledgement. | Service Acknowledgement |
| Service Acknowledgement Item | A ServiceAcknowledgementItem specifies a service (service product) entered by the ServiceAcknowledgement or additional information about the service (service product). In addition, to service products, materials that are required for fulfilling a service can be specified. The ServiceAcknowledgementItem contains detailed information about a product, its price, quantity, and date. For the ServiceAcknowledgementItem (compared to the information of the ServiceAcknowledgement), deviating parties and locations can be defined. The ServiceAcknowledgementItem can contain references to other business documents relevant for the item. Notes or references to attachments also can be specified. A ServiceAcknowledgementItem can be subordinate to another ServiceAcknowledgementItem within a hierarchy, thereby establishing a business relationship between the two items. This relationship also can be used to group together ServiceAcknowledgement items; that is, a ServiceAcknowledgementItem can group together other ServiceAcknowledgementItems. | Service Acknowledgement Item |
| Shipment | A Shipment is a collection of products that are transported together from a ship-from location to ship-to location. | |
| SourceOf Supply | A SourceOfSupply is a procurement option for a particular product or product category. In particular, it includes information about prices and ship-to/ship-from locations. | SourceOfSupply |

-continued

| Entity | Definition | Global Data Type |
|---|---|---|
| TaxDue | A TaxDue is information from a business document that is required in order to report or pay tax due to the tax authorities. TaxDue contains information about the business partners subject to tax, the tax events based to which the business partners are subject to tax/tax exempt, and about the type and amount of tax due. | TaxDue |
| TaxDueItem | A TaxDueItem is information from an item of a business document that is required in order to report or pay tax due to the tax authorities. TaxDueItem contains information about the business partners subject to tax, the tax events based on which the business partners are subject to tax/tax exempt, and about the type and amount of tax due. | TaxDueItem |
| Transmission Catalogue | A TRANSMISSIONCATALOGUE is a new, changed or deleted Catalogue for the purpose of transmission. | Transmission Catalogue |
| VAT Declaration | A VATDeclaration is a tax return for tax on sales/purchases to a tax authority. | |
| VAT DeclarationItem | A VATDeclarationItem is detailed information on the type and scope of reported taxes on sales/purchases. | |
| Vendor GeneratedOrder | A VendorGeneratedOrder is a purchase order that is planned and initiated by a vendor for a customer and is intended to trigger a replenishment delivery for the customer. | |
| Vendor GeneratedOrder Item | A VendorGeneratedOrderItem describes when and where certain quantities of a product that is listed in a VendorGeneratedOrder will be delivered or can be picked up. | |
| VendorInvoice | A VendorInvoice is an incoming invoice. | |

c) Packages

Packages group the entities in the business object model and the resulting interfaces into groups of semantically associated information. Packages also may include "sub"-packages, i.e., the packages may be nested.

Figure 252:
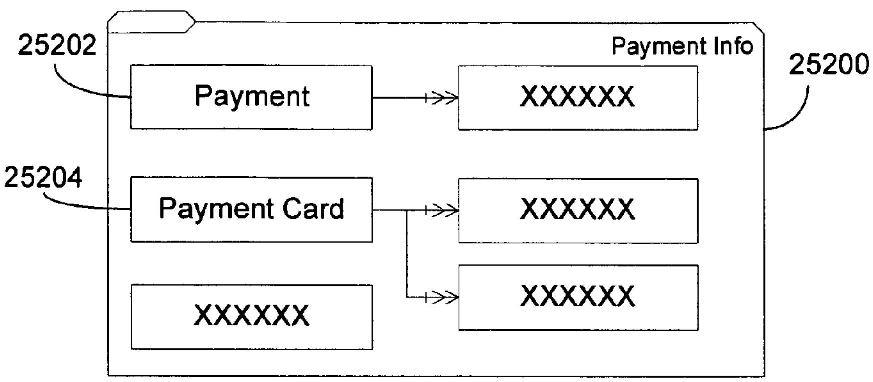
FIG. 252 depicts an example of a package in accordance with methods and systems consistent with the present invention.

Packages may group elements together based on different factors, such as elements that occur together as a rule with regard to a business-related aspect. For example, as depicted in FIG. 252, in a Purchase Order, different information regarding the purchase order, such as the type of payment 25202, and payment card 25204, are grouped together via the PaymentInformation package 25200.

Figure 253:
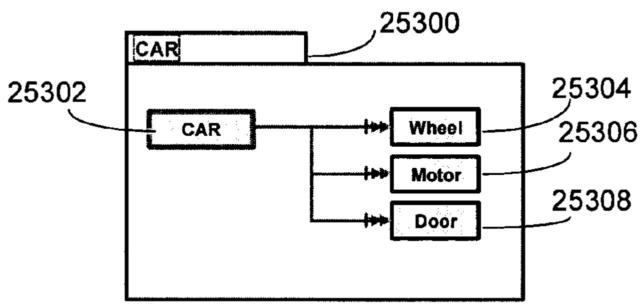
FIG. 253 depicts another example of a package in accordance with methods and systems consistent with the present invention.

Packages also may combine different components that result in a new object. For example, as depicted in FIG. 253, the components wheels 25304, motor 25306, and doors 25308 are combined to form a composition "Car" 25302. The "Car" package 25300 includes the wheels, motor and doors as well as the composition "Car."

Figure 254:
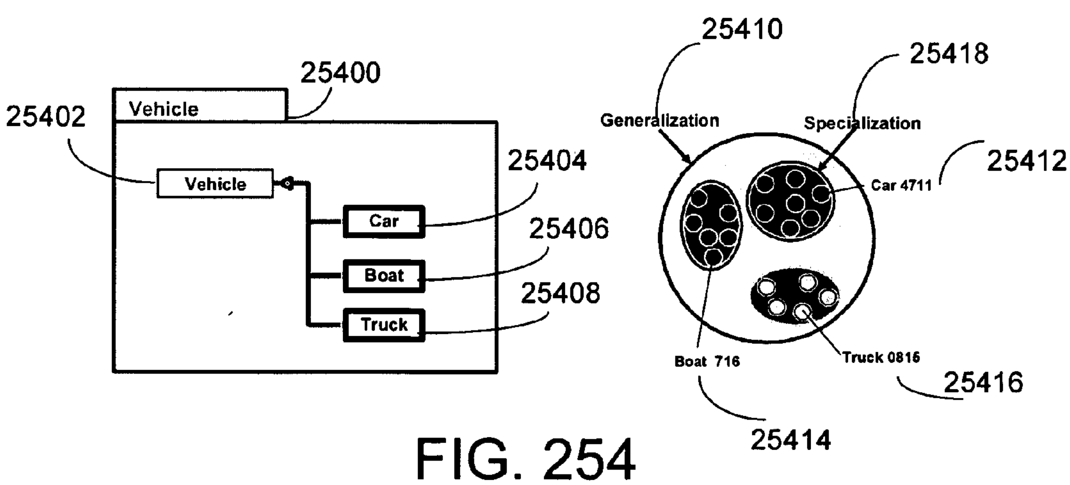
FIG. 254 depicts a third example of a package in accordance with methods and systems consistent with the present invention.

Another grouping within a package may be subtypes within a type. In these packages, the components are specialized forms of a generic package. For example, as depicted in FIG. 254, the components Car 25404, Boat 25406, and Truck 25408 can be generalized by the generic term Vehicle 25402 in Vehicle package 25400. Vehicle in this case is the generic package 25410, while Car 25412, Boat 25414, and Truck 25416 are the specializations 25418 of the generalized vehicle 25410.

Figure 255:
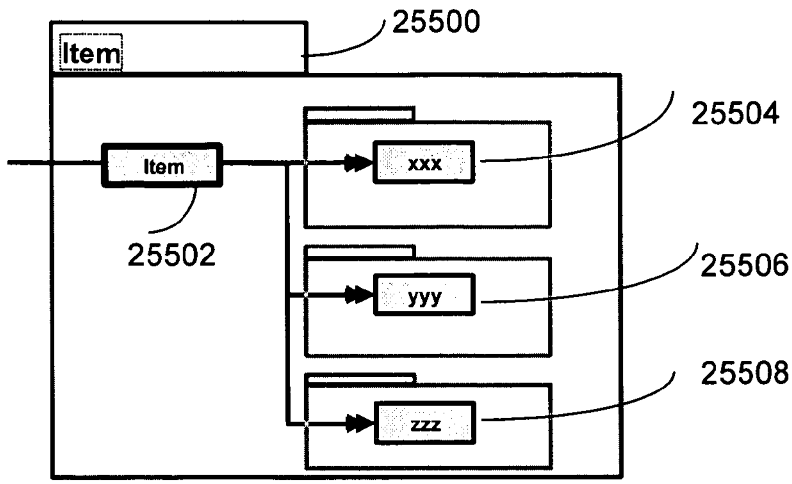
FIG. 255 depicts a fourth example of a package in accordance with methods and systems consistent with the present invention.

Packages also may be used to represent hierarchy levels. For example, as depicted in FIG. 255, the Item Package 25500 includes Item 25502 with subitem xxx 25504, subitem yyy 25506, and subitem zzz 25508.

Figure 256:
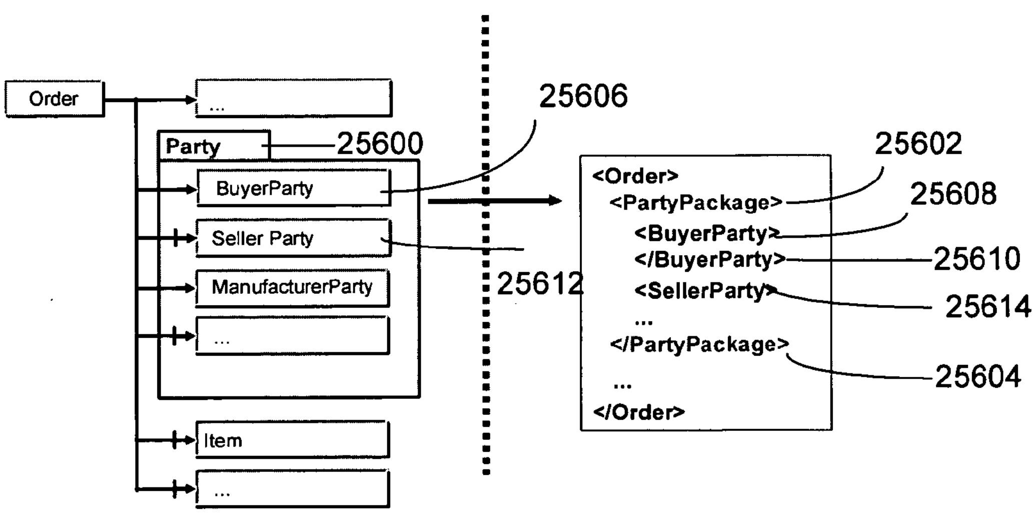
FIG. 256 depicts the representation of a package in the XML schema in accordance with methods and systems consistent with the present invention.

Packages can be represented in the XML schema as a comment. One advantage of this grouping is that the document structure is easier to read and is more understandable. The names of these packages are assigned by including the object name in brackets with the suffix "Package." For example, as depicted in FIG. 256, Party package 25600 is enclosed by <PartyPackage> 25602 and </PartyPackage> 25604. Party package 25600 illustratively includes a Buyer Party 25606, identified by <BuyerParty> 25608 and </BuyerParty> 25610, and a Seller Party 25612, identified by <SellerParty> 25614 and </SellerParty>, etc.

d) Relationships

Relationships describe the interdependencies of the entities in the business object model, and are thus an integral part of the business object model.

(1) Cardinality of Relationships

Figure 257:
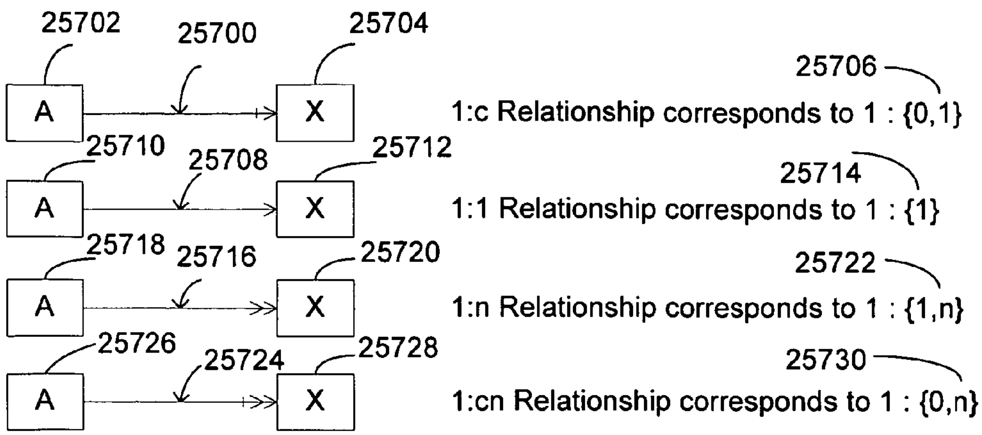
FIG. 257 depicts a graphical representation of the cardinalities between two entities in accordance with methods and systems consistent with the present invention.

FIG. 257 depicts a graphical representation of the cardinalities between two entities. The cardinality between a first entity and a second entity identifies the number of second entities that could possibly exist for each first entity. Thus, a 1:c cardinality 25700 between entities A 25702 and X 25704 indicates that for each entity A 25702, there is either one or zero 25706 entity X 25704. A 1:1 cardinality 25708 between entities A 25710 and X 25712 indicates that for each entity A 25710, there is exactly one 25714 entity X 25712. A 1:n cardinality 25716 between entities A 25718 and X 25720 indicates that for each entity A 25718, there are one or more 25722 entity Xs 25720. A 1:cn cardinality 25724 between entities A 25726 and X 25728 indicates that for each entity A 25726, there are any number 25730 of entity Xs 25728 (i.e., 0 through n Xs for each A).

(2) Types of Relationships (a) Composition

Figure 258:
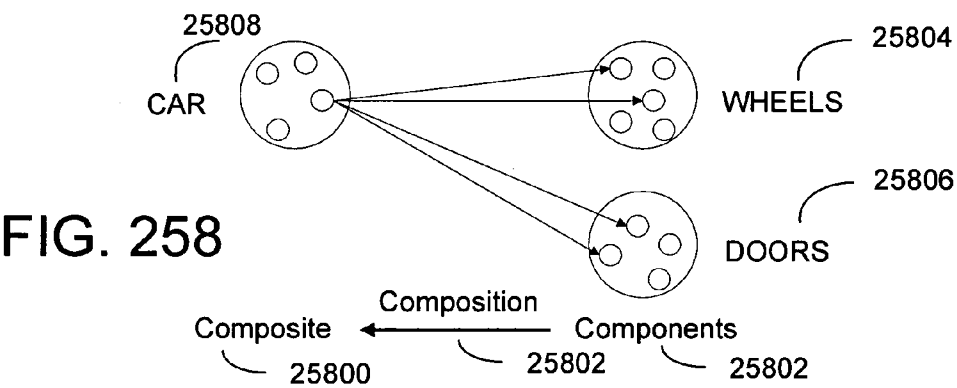
FIG. 258 depicts an example of a composition in accordance with methods and systems consistent with the present invention.
Figure 259:
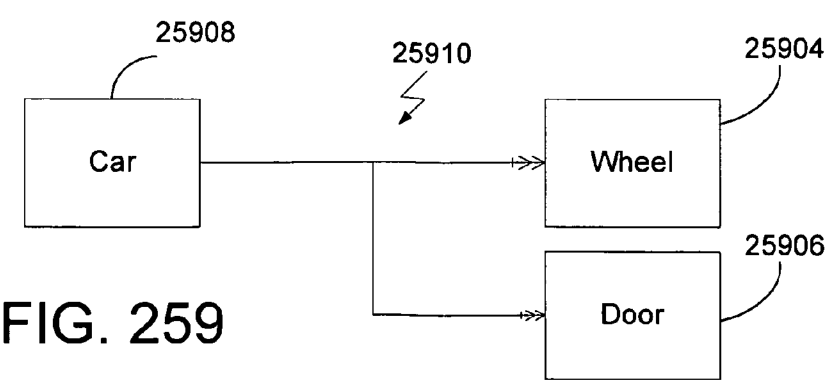
FIG. 259 depicts an example of a hierarchical relationship in accordance with methods and systems consistent with the present invention.

A composition or hierarchical relationship type is a strong whole-part relationship which is used to describe the structure within an object. The parts, or dependent entities, represent a semantical refinement or partition of the whole, or less dependent entity. For example, as depicted in FIG. 258, the components 25802 wheels 25804 and doors 25806 may be combined to form the composite 25800 "Car" 25808 using the composition 25810. FIG. 259 depicts a graphical representation of the composition 25910 between composite Car 25908 and components wheel 25904 and door 25906.

(b) Aggregation

Figure 260:
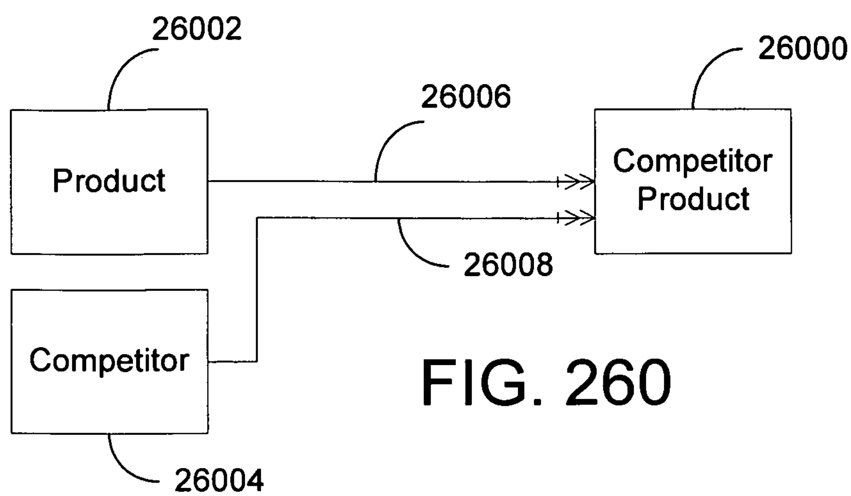
FIG. 260 depicts an example of an aggregating relationship in accordance with methods and systems consistent with the present invention.

An aggregation or an aggregating relationship type is a weak whole-part relationship between two objects. The dependent object is created by the combination of one or several less dependent objects. For example, as depicted in FIG. 260, the properties of a competitor product 26000 are determined by a product 26002 and a competitor 26004. A hierarchical relationship 26006 exists between the product 26002 and the competitor product 26000 because the competitor product 26000 is a component of the product 26002. Therefore, the values of the attributes of the competitor product 26000 are determined by the product 26002. An aggregating relationship 26008 exists between the competitor 26004 and the competitor product 26000 because the competitor product 26000 is differentiated by the competitor 26004. Therefore the values of the attributes of the competitor product 26000 are determined by the competitor 26004.

(c) Association

Figure 261:
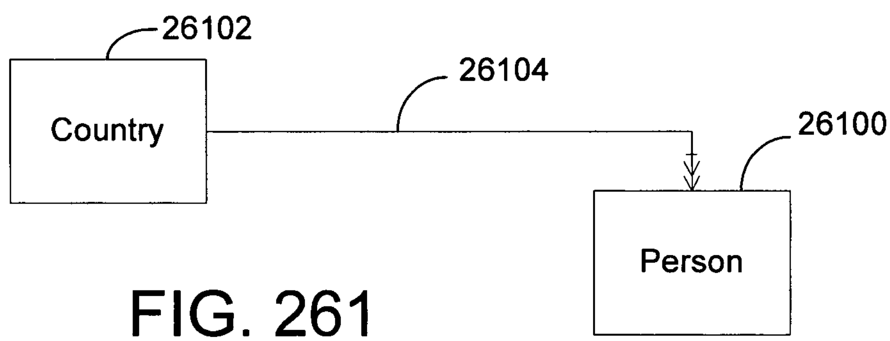
FIG. 261 depicts an example of an association in accordance with methods and systems consistent with the present invention.

An association or a referential relationship type describes a relationship between two objects in which the dependent object refers to the less dependent object. For example, as depicted in FIG. 261, a person 26100 has a nationality, and thus, has a reference to its country 26102 of origin. There is an association 26104 between the country 26102 and the person 26100. The values of the attributes of the person 26100 are not determined by the country 26102.

(3) Specialization

Figure 262:
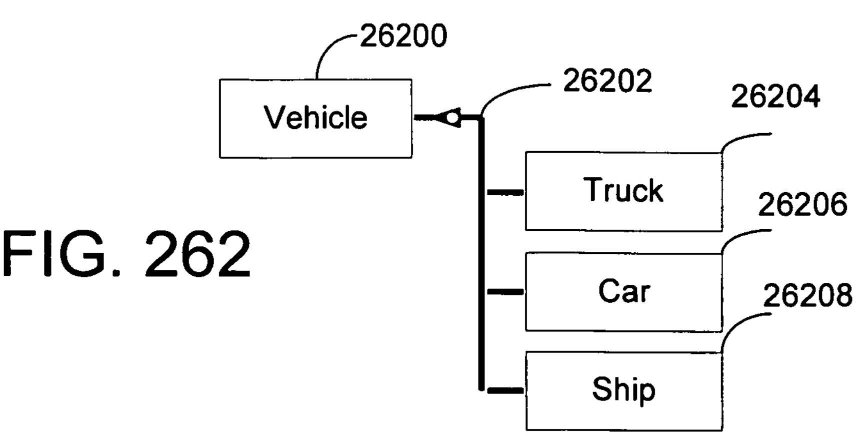
FIG. 262 depicts an example of a specialization in accordance with methods and systems consistent with the present invention.

Entity types may be divided into subtypes based on characteristics of the entity types. For example, FIG. 262 depicts an entity type "vehicle" 26200 specialized 26202 into subtypes "truck" 26204, "car" 26206, and "ship" 26208. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 263:
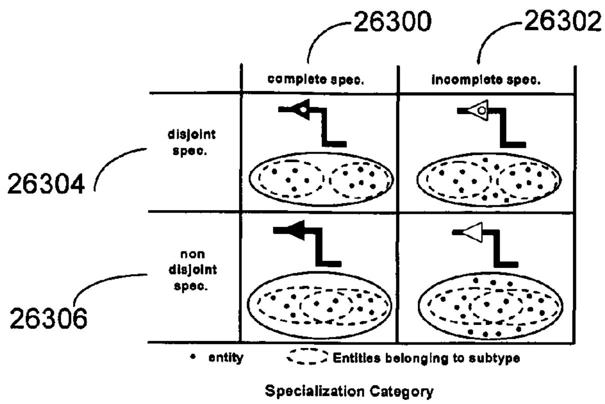
FIG. 263 depicts the categories of specializations in accordance with methods and systems consistent with the present invention.

As depicted in FIG. 263, specializations may further be characterized as complete specializations 26300 or incomplete specializations 26302. There is a complete specialization 26300 where each entity of the generalized type belongs to at least one subtype. With an incomplete specialization 26302, there is at least one entity that does not belong to a subtype. Specializations also may be disjoint 26304 or nondisjoint 26306. In a disjoint specialization 26304, each entity of the generalized type belongs to a maximum of one subtype. With a nondisjoint specialization 26306, one entity may belong to more than one subtype. As depicted in FIG. 263, four specialization categories result from the combination of the specialization characteristics.

e) Structural Patterns (1) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is either 1:n or 1:cn. In the case of the entity type chart of accounts, there is a hierarchical relationship of the cardinality 1:n with the entity type chart of accounts item since a chart of accounts has at least one item in all cases.

(2) Hierarchy

Figure 264:
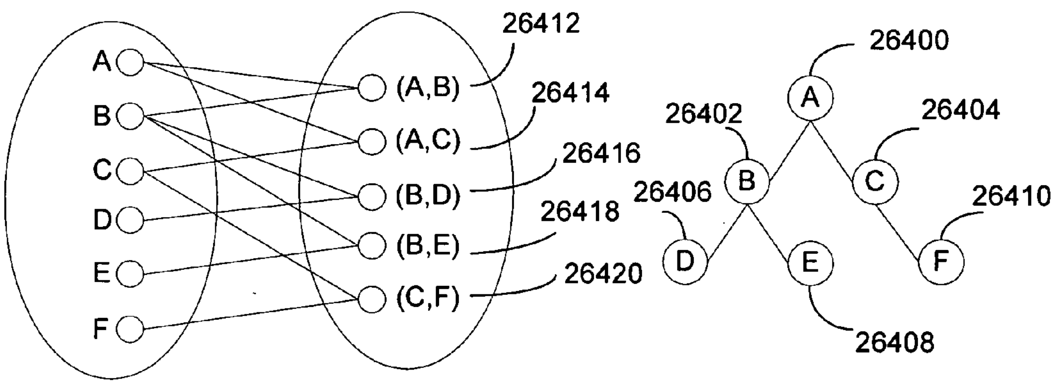
FIG. 264 depicts an example of a hierarchy in accordance with methods and systems consistent with the present invention.

A hierarchy describes the assignment of subordinate entities to superordinate entities and vice versa, where several entities of the same type are subordinate entities that have, at most, one directly superordinate entity. For example, in the hierarchy depicted in FIG. 264, entity B 26402 is subordinate to entity A 26400, resulting in the relationship (A,B) 26412. Similarly, entity C 26404 is subordinate to entity A 26400, resulting in the relationship (A,C) 26414. Entity D 26406 and entity E 26408 are subordinate to entity B 26402, resulting in the relationships (B,D) 26416 and (B,E) 26418, respectively. Entity F 26410 is subordinate to entity C 26404, resulting in the relationship (C,F) 26420.

Figure 265:
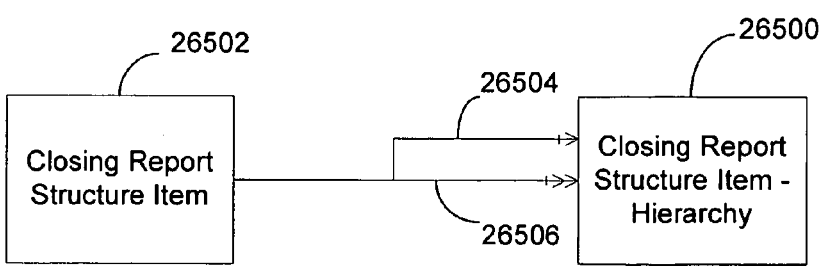
FIG. 265 depicts a graphical representation of a hierarchy in accordance with methods and systems consistent with the present invention.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 265 depicts a graphical representation of a Closing Report Structure Item hierarchy 26500 for a Closing Report Structure Item 26502. The hierarchy illustrates the 1:c cardinality 26504 between a subordinate entity and its superordinate entity, and the 1:cn cardinality 26506 between a superordinate entity and its subordinate entity.

3. Creation of the Business Object Model

Figure 266A:
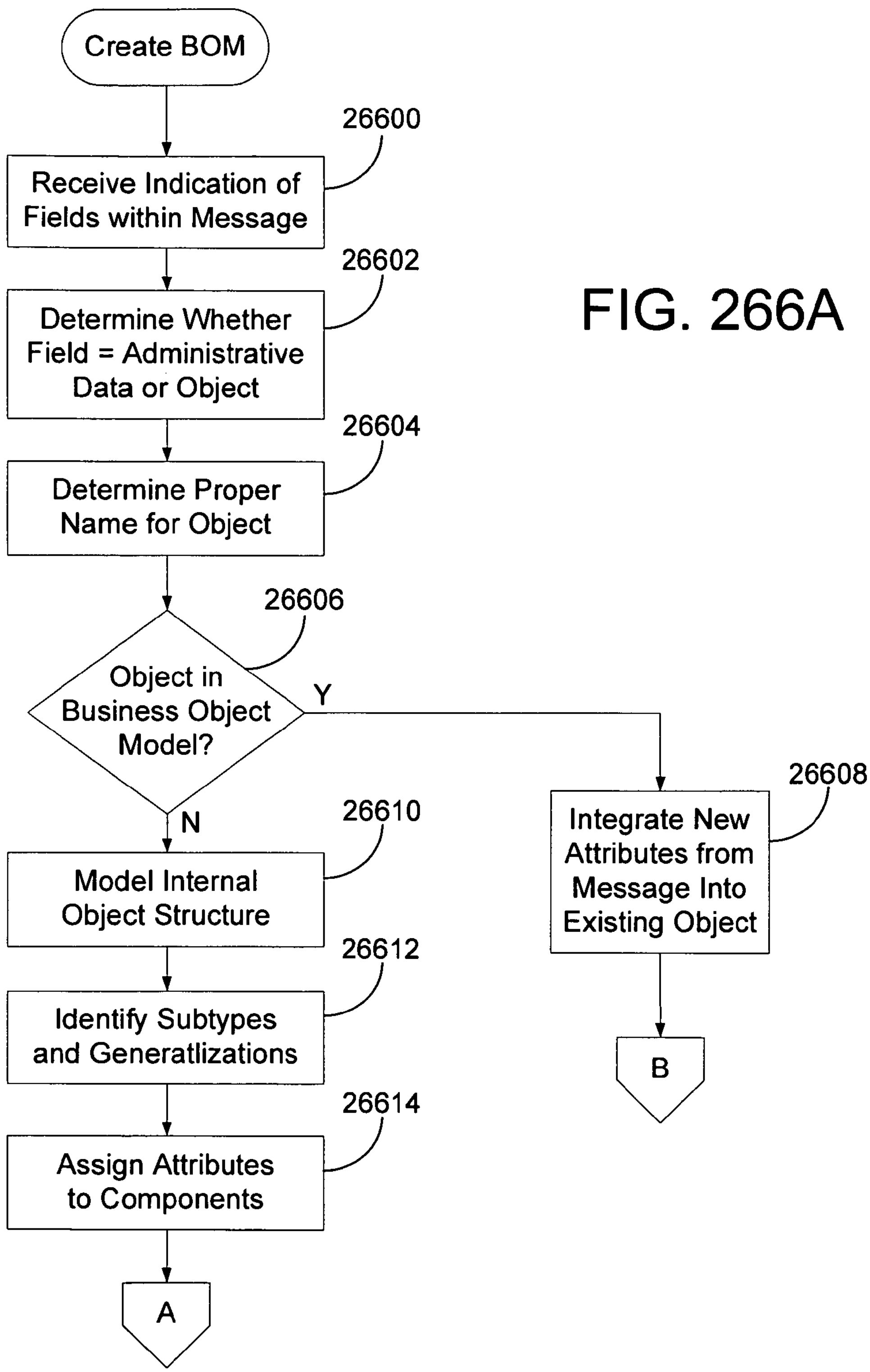
FIGS. 266A-B depict a flow diagram of the steps performed to create a business object model in accordance with methods and systems consistent with the present invention.
Figure 266B:
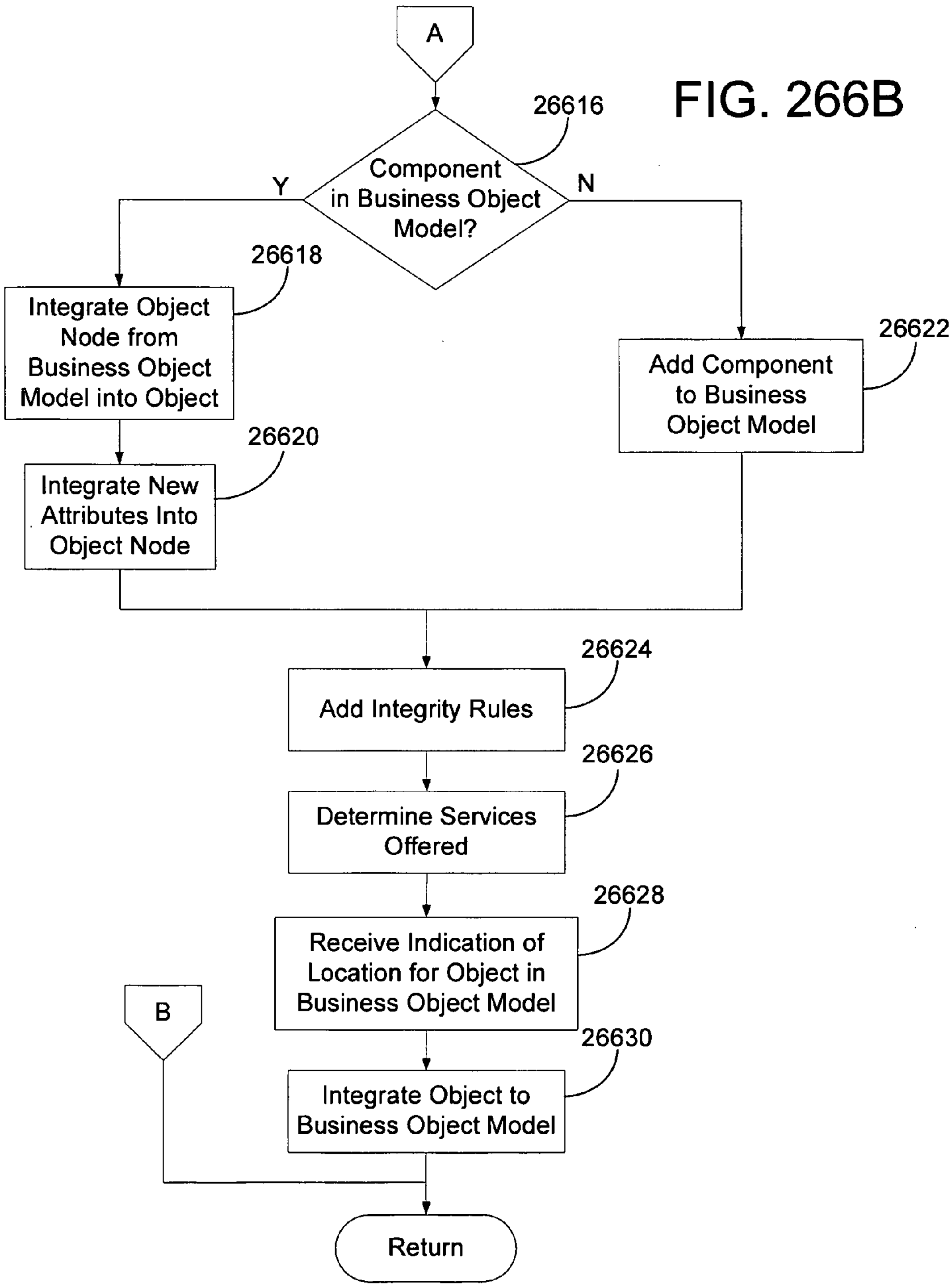

FIGS. 266A-B depict the steps performed using methods and systems consistent with the present invention to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 26600, FIG. 266A). The designers then determine whether each field relates to administrative data or is part of the object (step 26602). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission | |
| Indicator | |
| Buyer | |
| BuyerOrganisationName | |
| Person Name | |

-continued

| |
|---|
| FunctionalTitle |
| DepartmentName |
| CountryCode |
| StreetPostalCode |
| POBox Postal Code |
| Company Postal Code |
| City Name |
| DistrictName |
| PO Box ID |
| PO Box Indicator |
| PO Box Country Code |
| PO Box Region Code |
| PO Box City Name |
| Street Name |
| House ID |
| Building ID |
| Floor ID |
| Room ID |
| Care Of Name |
| AddressDescription |
| Telefonnumber |
| MobileNumber |
| Facsimile |
| Email |
| Seller |
| SellerAddress |
| Location |
| LocationType |
| DeliveryItemGroupID |
| DeliveryPriority |
| DeliveryCondition |
| TransferLocation |
| NumberofPartialDelivery |
| QuantityTolerance |
| MaximumLeadTime |
| TransportServiceLevel |
| TranportCondition |
| TransportDescription |
| CashDiscountTerms |
| PaymentForm |
| PaymentCardID |
| PaymentCardReferenceID |
| SequenceID |
| Holder |
| ExpirationDate |
| AttachmentID |
| AttachmentFilename |
| DescriptionofMessage |
| ConfirmationDescriptionof Message |
| FollowUpActivity |
| ItemID |
| ParentItemID |
| HierarchyType |
| ProductID |
| ProductType |
| ProductNote |
| ProductCategoryID |
| Amount |
| BaseQuantity |
| ConfirmedAmount |
| ConfirmedBaseQuantity |
| ItemBuyer |
| ItemBuyerOrganisationName |
| Person Name |
| FunctionalTitle |
| DepartmentName |
| CountryCode |
| StreetPostalCode |
| POBox Postal Code |
| Company Postal Code |
| City Name |
| DistrictName |
| PO Box ID |
| PO Box Indicator |
| PO Box Country Code |
| PO Box Region Code |
| PO Box City Name |
| Street Name |
| House ID |

-continued

| |
|---|
| Building ID |
| Floor ID |
| Room ID |
| Care Of Name |
| AddressDescription |
| Telefonnumber |
| MobilNumber |
| Facsimile |
| Email |
| ItemSeller |
| ItemSellerAddress |
| ItemLocation |
| ItemLocationType |
| ItemDeliveryItemGroupID |
| ItemDeliveryPriority |
| ItemDeliveryCondition |
| ItemTransferLocation |
| ItemNumberofPartialDelivery |
| ItemQuantityTolerance |
| ItemMaximumLeadTime |
| ItemTransportServiceLevel |
| ItemTranportCondition |
| ItemTransportDescription |
| ContractReference |
| QuoteReference |
| CatalogueReference |
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 26604). In the example above, the proper name for the "Main Object" is "Purchase Order." After naming the object, the system that is creating the business object model determines whether the object already exists in the business object model (step 26606). If the object already exists, the system integrates new attributes from the message into the existing object (step 26608), and the process is complete.

If at step 26606 the system determines that the object does not exist in the business object model, the designers model the internal object structure (step 26610). To model the internal structure, the designers define the components. For the above example, the designers may define the components identified below.

| | | |
|---|---|---|
| ID | Purchase Order | |
| AdditionalID | | |
| PostingDate | | |
| LastChangeDate | | |
| AcceptanceStatus | | |
| Note | | |
| CompleteTransmission Indicator | | |
| Buyer | | Buyer |
| BuyerOrganisationName | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |

-continued

| | | |
|---|---|---|
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobileNumber | | |
| Facsimile | | |
| Email | | |
| Seller | Seller | |
| SellerAddress | | |
| Location | Location | |
| LocationType | | |
| DeliveryItemGroupID | Delivery | |
| DeliveryPriority | Terms | |
| DeliveryCondition | | |
| TransferLocation | | |
| NumberofPartialDelivery | | |
| QuantityTolerance | | |
| MaximumLeadTime | | |
| TransportServiceLevel | | |
| TranportCondition | | |
| TransportDescription | | |
| CashDiscountTerms | | |
| PaymentForm | Payment | |
| PaymentCardID | | |
| PaymentCardReferenceID | | |
| SequenceID | | |
| Holder | | |
| ExpirationDate | | |
| AttachmentID | | |
| AttachmentFilename | | |
| DescriptionofMessage | | |
| ConfirmationDescriptionof Message | | |
| FollowUpActivity | | |
| ItemID | Purchase | |
| ParentItemID | Order Item | |
| HierarchyType | | |
| ProductID | | Product |
| ProductType | | |
| ProductNote | | |
| ProductCategoryID | | ProductCategory |
| Amount | | |
| BaseQuantity | | |
| ConfirmedAmount | | |
| ConfirmedBaseQuantity | | |
| ItemBuyer | | Buyer |
| ItemBuyerOrganisation Name | | |
| Person Name | | |

-continued

| | |
|---|---|
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | Seller |
| ItemSellerAddress | |
| ItemLocation | Location |
| ItemLocationType | |
| ItemDeliveryItemGroupID | |
| ItemDeliveryPriority | |
| ItemDeliveryCondition | |
| ItemTransferLocation | |
| ItemNumberofPartial Delivery | |
| ItemQuantityTolerance | |
| ItemMaximumLeadTime | |
| ItemTransportServiceLevel | |
| ItemTranportCondition | |
| ItemTransportDescription | |
| ContractReference | Contract |
| QuoteReference | Quote |
| CatalogueReference | Catalogue |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0 . . . 1 |
| | | Address | | 0 . . . 1 |
| | | ContactPerson | | 0 . . . 1 |
| | | | Address | 0 . . . 1 |
| | Seller | | | 0 . . . 1 |
| | Location | | | 0 . . . 1 |
| | | Address | | 0 . . . 1 |
| | DeliveryTerms | | | 0 . . . 1 |
| | | Incoterms | | 0 . . . 1 |
| | | PartialDelivery | | 0 . . . 1 |
| | | QuantityTolerance | | 0 . . . 1 |
| | | Transport | | 0 . . . 1 |
| | CashDiscountTerms | | | 0 . . . 1 |
| | | MaximumCashDiscount | | 0 . . . 1 |
| | | NormalCashDiscount | | 0 . . . 1 |
| | PaymentForm | | | 0 . . . 1 |
| | | PaymentCard | | 0 . . . 1 |

-continued

| | | | |
|---|---|---|---|
| Attachment | | | 0 . . . n |
| Description | | | 0 . . . 1 |
| Confirmation Description | | | 0 . . . 1 |
| Item | | | 0 . . . n |
| | HierarchyRelationship | | 0 . . . 1 |
| | Product | | 0 . . . 1 |
| | ProductCategory | | 0 . . . 1 |
| | Price | | 0 . . . 1 |
| | | NetUnitPrice | 0 . . . 1 |
| | ConfirmedPrice | | 0 . . . 1 |
| | | NetUnitPrice | 0 . . . 1 |
| | Buyer | | 0 . . . 1 |
| | Seller | | 0 . . . 1 |
| | Location | | 0 . . . 1 |
| | DeliveryTerms | | 0 . . . 1 |
| | Attachment | | 0 . . . n |
| | Description | | 0 . . . 1 |
| | ConfirmationDescription | | 0 . . . 1 |
| | ScheduleLine | | 0 . . . n |
| | | DeliveryPeriod | 1 |
| | ConfirmedScheduleLine | | 0 . . . n |

After modeling the internal object structure, the developers identify the subtypes and generalizations for all objects and components (step 26612). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| PurchaseOrder | | | | | 1 |
| | PurchaseOrder Update | | | | |
| | | PurchaseOrder Request | | | |
| | | PurchaseOrder Change | | | |
| | | PurchaseOrder Confirmation | | | |
| | PurchaseOrder Cancellation | | | | |
| | PurchaseOrder Information | | | | |
| | Party | | | | |
| | | BuyerParty | | | 0 . . . 1 |
| | | | Address | | 0 . . . 1 |
| | | | ContactPerson | | 0 . . . 1 |
| | | | | Address | 0 . . . 1 |
| | | SellerParty | | | 0 . . . 1 |
| | Location | | | | |
| | | ShipToLocation | | | 0 . . . 1 |
| | | | Address | | 0 . . . 1 |
| | | ShipFromLocation | | | 0 . . . 1 |
| | | | Address | | 0 . . . 1 |
| | DeliveryTerms | | | | 0 . . . 1 |
| | | Incoterms | | | 0 . . . 1 |
| | | PartialDelivery | | | 0 . . . 1 |
| | | QuantityTolerance | | | 0 . . . 1 |
| | | Transport | | | 0 . . . 1 |
| | CashDiscount Terms | | | | 0 . . . 1 |
| | | MaximumCash Discount | | | 0 . . . 1 |
| | | NormalCashDiscount | | | 0 . . . 1 |
| | PaymentForm | | | | 0 . . . 1 |
| | | PaymentCard | | | 0 . . . 1 |
| | Attachment | | | | 0 . . . n |
| | Description | | | | 0 . . . 1 |
| | Confirmation Description | | | | 0 . . . 1 |
| | Item | | | | 0 . . . n |
| | | HierarchyRelationship | | | 0 . . . 1 |
| | | Product | | | 0 . . . 1 |
| | | ProductCategory | | | 0 . . . 1 |
| | | Price | | | 0 . . . 1 |
| | | | NetUnitPrice | | 0 . . . 1 |

-continued

| | | | |
|---|---|---|---|
| | ConfirmedPrice | | 0 . . . 1 |
| | | NetUnitPrice | 0 . . . 1 |
| | Party | | |
| | | BuyerParty | 0 . . . 1 |
| | | SellerParty | 0 . . . 1 |
| | Location | | |
| | | ShipTo Location | 0 . . . 1 |
| | | ShipFrom Location | 0 . . . 1 |
| | DeliveryTerms | | 0 . . . 1 |
| | Attachment | | 0 . . . n |
| | Description | | 0 . . . 1 |
| | Confirmation Description | | 0 . . . 1 |
| | ScheduleLine | | 0 . . . n |
| | | Delivery Period | 1 |
| | ConfirmedScheduleLine | | 0 . . . n |

After identifying the subtypes and generalizations, the developers assign the attributes to these components (step 26614). The attributes for a portion of the components are shown below.

| | | | | |
|---|---|---|---|---|
| Purchase Order | | | | 1 |
| | ID | | | 1 |
| | SellerID | | | 0 . . . 1 |
| | BuyerPosting DateTime | | | 0 . . . 1 |
| | BuyerLast ChangeDate Time | | | 0 . . . 1 |
| | SellerPosting DateTime | | | 0 . . . 1 |
| | SellerLast ChangeDate Time | | | 0 . . . 1 |
| | Acceptance StatusCode | | | 0 . . . 1 |
| | Note | | | 0 . . . 1 |
| | ItemList Complete Transmission Indicator | | | 0 . . . 1 |
| | BuyerParty | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | | ContactPerson | | 0 . . . 1 |
| | | | BuyerID | 0 . . . 1 |
| | | | SellerID | 0 . . . 1 |
| | | | Address | 0 . . . 1 |
| | SellerParty | | | 0 . . . 1 |
| | Product RecipientParty | | | 0 . . . 1 |
| | VendorParty | | | 0 . . . 1 |
| | Manufacturer Party | | | 0 . . . 1 |
| | BillToParty | | | 0 . . . 1 |
| | PayerParty | | | 0 . . . 1 |
| | CarrierParty | | | 0 . . . 1 |
| | ShipTo Location | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | ShipFrom Location | | | 0 . . . 1 |

The system then determines whether the component is one of the object nodes in the business object model (step 26616, FIG. 266B). If the system determines that the component is one of the object nodes in the business object model, the system integrates a reference to the corresponding object node from the business object model into the object (step 26618). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | | |
| | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 26620). If at step 26616, the system determines that the component is not in the business object model, the system adds the component to the business object model (step 26622).

Regardless of whether the component was in the business object model at step 26616, the next step in creating the business object model is to add the integrity rules (step 26624). There are several levels of integrity rules and constraints which should be described. These levels include consistency rules between attributes, consistency rules between components, and consistency rules to other objects. Next, the designers determine the services offered, which can be accessed via interfaces (step 26626). The services offered in the example above include PurchaseOrderCreateRequest, PurchaseOrderCancellationRequest, and PurchaseOrderReleaseRequest. The system then receives an indication of the location for the object in the business object model (step 26628). After receiving the indication of the location, the system integrates the object into the business object model (step 26630).

4. Structure of the Business Object Model

The business object model, which serves as the basis for the process of generating consistent interfaces, includes the elements contained within the interfaces. These elements are arranged in a hierarchical structure within the business object model.

Figure 267A:
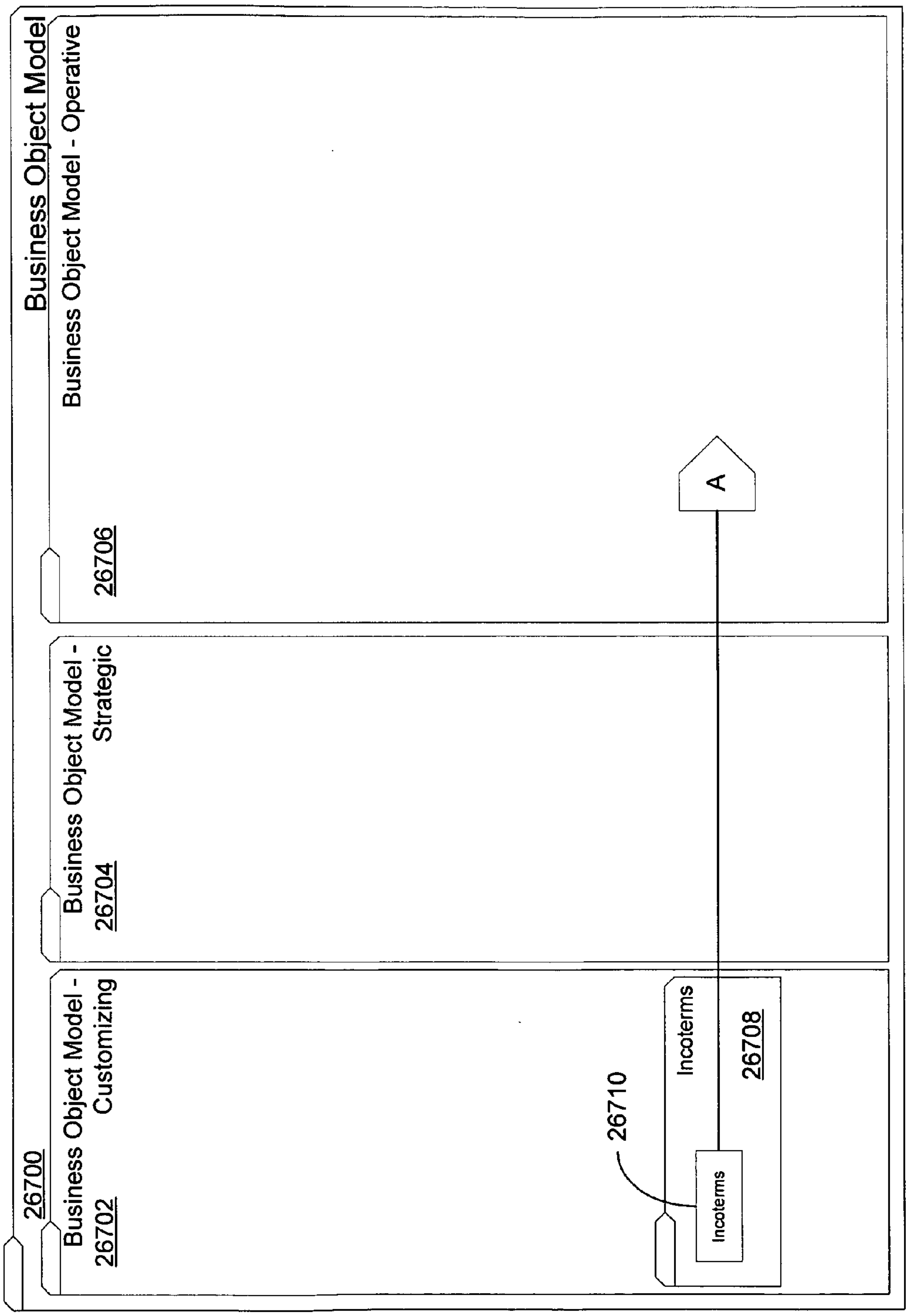
FIGS. 267A-NN depict the business object model in accordance with methods and systems consistent with the present invention.
Figure 267B:
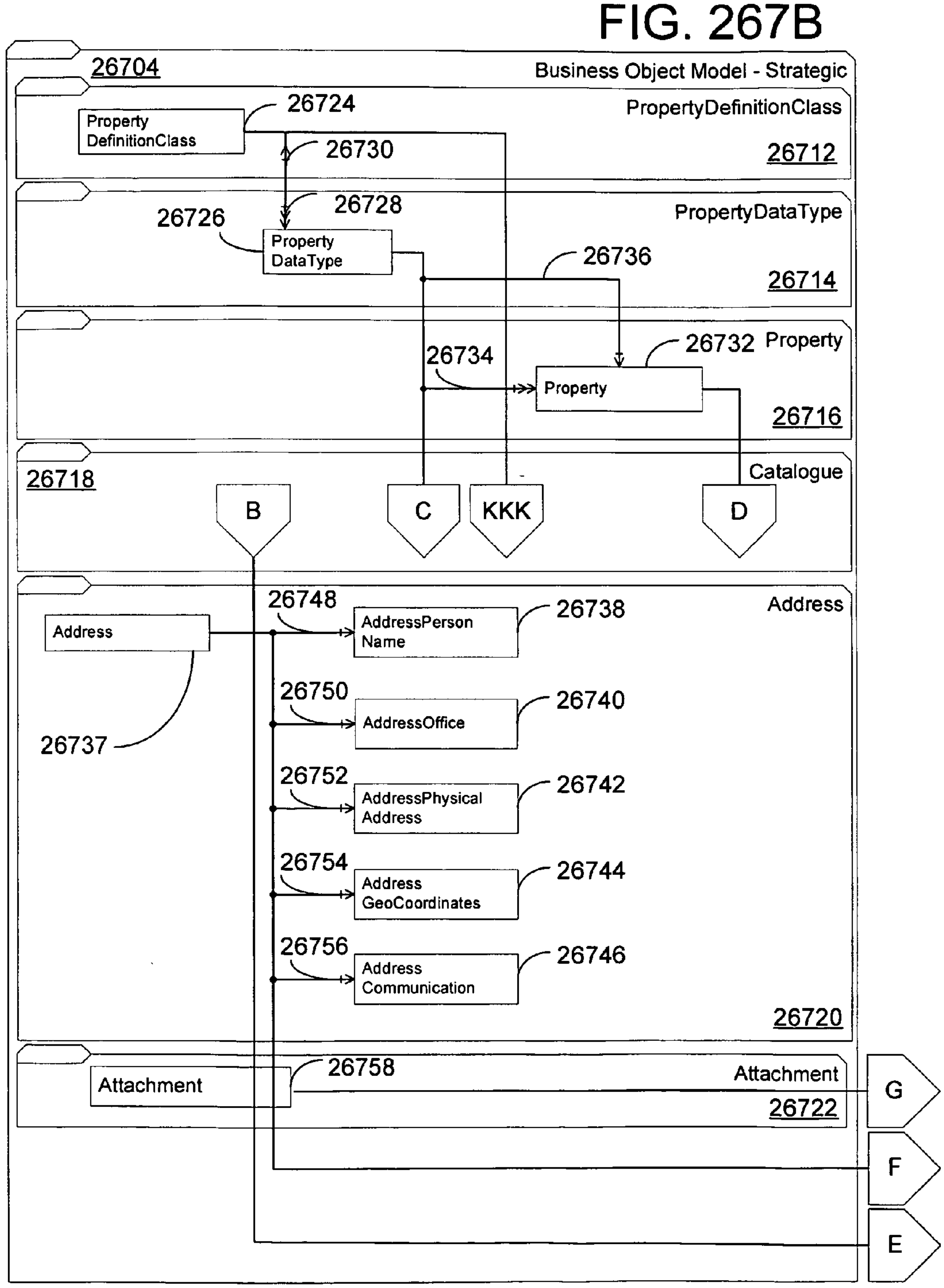
Figure 267C:
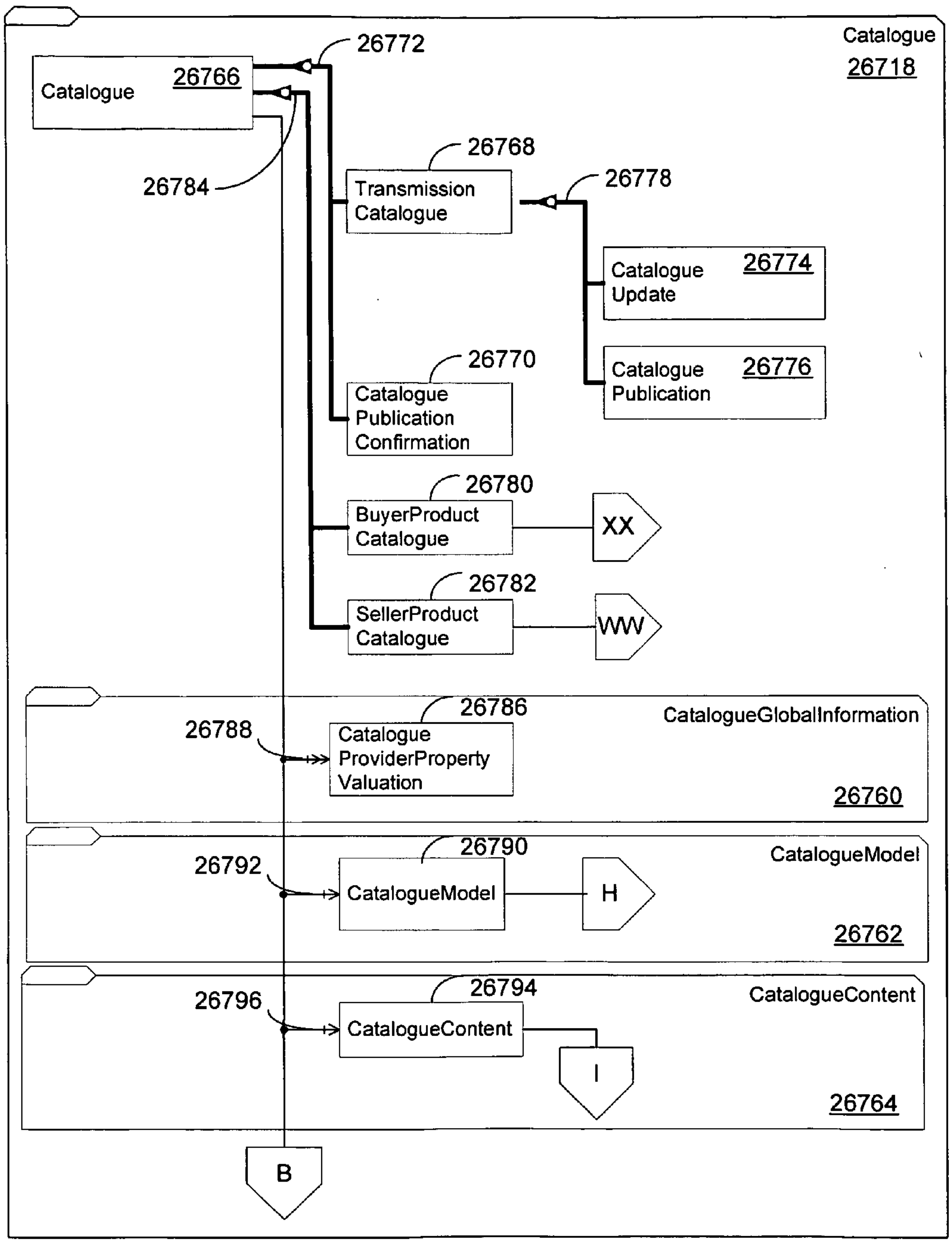
Figure 267D:
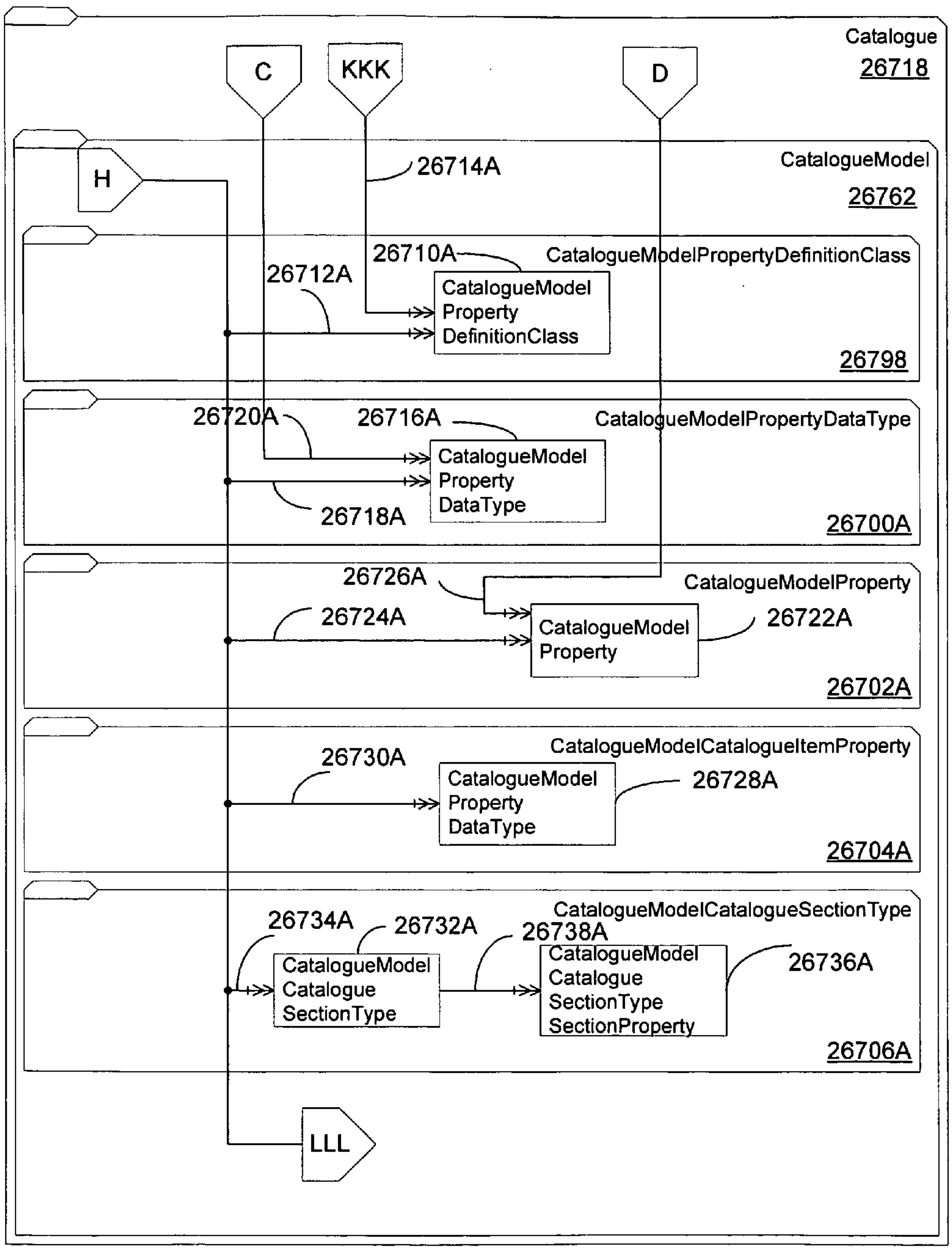
Figure 267E:
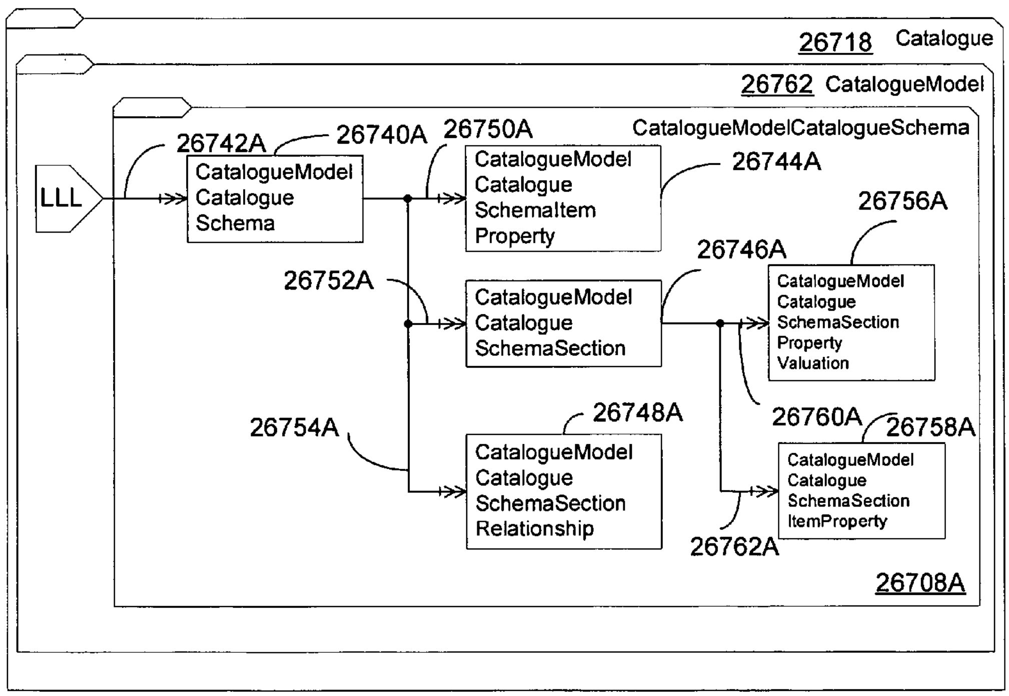

FIGS. 267A-NN depict an exemplary Business Object Model in accordance with methods and systems consistent with the present invention. The business object model includes a BusinessObjectModel package 26700, which includes a BusinessObjectModel—Customizing package 26702, a BusinessObjectModel—Strategic package 26704, and a BusinessObjectModel—Operative package 26706.

The BusinessObjectModel—Customizing package 26702 includes an Incoterms package 26708. The Incoterms package 26708 includes an Incoterms entity 26710.

The BusinessObjectModel—Strategic package 26704 includes a PropertyDefinitionClass package 26712, a PropertyDataType package 26714, a Property package 26716, a Catalogue package 26718, an Address package 26720, and an Attachment package 26722. The PropertyDefinitionClass package 26712 includes a PropertyDefinitionClass entity 26724. The PropertyDataType package 26714 includes a PropertyDataType entity 26726. There is a 1:n relationship 26728 between the PropertyDefinitionClass entity 26724 and the PropertyDataType entity 26726. There is a 1:c relationship 26730 between the PropertyDataType entity 26728 and the PropertyDefinitionClass entity 26724. Thus, in some cases, there is an instance of the PropertyDataType entity 26728 with a reference to the PropertyDefinitionClass entity 26724.

The Property package includes a Property entity 26734. There is a 1:cn relationship 26734 between the PropertyDataType entity 26728 and the Property entity 26732. There is also a 1:c referential relationship 26736 between the PropertyDataType entity 26728 and the Property entity 26736.

The Address package 26720 includes an Address entity 26737. The Address entity 26737 includes an AddressPersonName entity 26738, an AddressOffice entity 26740, an AddressPhysicalAddress entity 26742, an AddressGeoCoordinates entity 26744, and an AddressCommunication entity 26746. There is a 1:c relationship 26748 between the Address entity 26737 and the AddressPersonName entity 26738. There is a 1:c relationship 26750 between the Address entity 26737 and the AddressOffice entity 26740. There is a 1:c relationship 26752 between the Address entity 26737 and the AddressPhysicalAddress entity 26742. There is a 1:c relationship 26754 between the Address entity 26737 and the AddressGeoCoordinates entity 26744. There is a 1:c relationship 26756 between the Address entity 26737 and the AddressCommunication entity 26746.

The Attachment package 26722 includes an Attachment entity 26758.

The Catalogue package 26718 includes a CatalogueGlobalInformation package 26760, a CatalogueModel package 26762, and a CatalogueContent package 26764. The Catalogue package 26718 also includes a Catalogue entity 26766. The Catalogue entity 26766 is specialized into a TransmissionCatalogue entity 26768 and a CataloguePublicationConfirmation entity 26770, which are disjoint complete specializations 26772 of the Catalogue entity 26766. The TransmissionCatalogue entity 26768 is specialized into a CatalogueUpdate entity 26774 and a CataloguePublication entity 26776, which are disjoint complete specializations 26778 of the TransmissionCatalogue entity 26768. The Catalogue entity 26766 is also specialized into a BuyerProductCatalogue entity 26780 and a SellerProductCatalogue entity 26782, which are disjoint complete specializations 26784 of the Catalogue entity 26766.

The CatalogueGlobalInformation package 26760 includes a CatalogueProviderPropertyValuation entity 26786. There is a 1:cn relationship 26788 between the Catalogue entity 26766 and the CatalogueProviderPropertyValuation entity 26786.

The CatalogueModel package 26762 includes a CatalogueModel entity 26790. There is a 1:c relationship 26792 between the Catalogue entity 26766 and the CatalogueModel entity 26790.

The CatalogueContent package 26764 includes a CatalogueContent entity 26794. There is a 1:c relationship 26796 between the Catalogue entity 26766 and the CatalogueContent entity 26794.

The CatalogueModel package 26762 includes a CatalogueModelPropertyDefinitionClass package 26798, a CatalogueModelPropertyDataType package 26700A, a CatalogueModelProperty package 26702A, a CatalogueModelCatalogueItemProperty package 26704A, a CatalogueModelCatalogueSectionType package 26706A, and a CatalogueModelCatalogueSchema package 26708A.

The CatalogueModelPropertyDefinitionClass package 26798 includes a CatalogueModelPropertyDefinitionClass entity 26710A. There is a 1:cn relationship 26714A between the PropertyDefinitionClass entity 26724 and the CatalogueModelPropertyDefinitionClass entity 26710A, and a 1:cn relationship 26712A between the CatalogueModel entity 26790 and the CatalogueModelPropertyDefinitionClass entity 26710A.

The CatalogueModelPropertyDataType package 26700A includes a CatalogueModelPropertyDataType entity 26716A. There is a 1:cn relationship 26718A between the CatalogueModel entity 26790 and the CatalogueModelPropertyDataType entity 26716A. There is a 1:cn relationship 26720A between the PropertyDataType entity 26726 and the CatalogueModelPropertyDataType entity 26716A.

The CatalogueModelProperty package 26702A includes a CatalogueModelProperty entity 26722A. There is a 1:cn relationship 26726A between the Property entity 26732 and the CatalogueModelProperty entity 26722A. There is a 1:cn relationship 26724A between the CatalogueModel entity 26790 and the CatalogueModelProperty entity 26722A.

The CatalogueModelCatalogueItemProperty package 26704A includes a CatalogueModelPropertyDataType entity 26728A. There is a 1:cn relationship 26730A between the CatalogueModel entity 26790 and the CatalogueModelPropertyDataType entity 26728A.

The CatalogueModelCatalogueSectionType package 26706A includes a CatalogueModelCatalogueSectionType entity 26732A. There is a 1:cn relationship 26734A between the CatalogueModel entity 26790 and the CatalogueModelCatalogueSectionType entity 26732A. The CatalogueModelCatalogueSectionType entity 26732A includes a CatalogueModelCatalogueSectionTypeSectionProperty entity 26736A. There is a 1:cn relationship 26738A between the CatalogueModelCatalogueSectionType entity 26732A and the CatalogueModelCatalogueSectionTypeSectionProperty entity 26736A.

The CatalogueModelCatalogueSchema package 26708A includes a CatalogueModelCatalogueSchema entity 26740A. There is a 1:cn relationship 26742A between the CatalogueModel entity 26790 and the CatalogueModelCatalogueSchema entity 26740A. The CatalogueModelCatalogueSchema entity 26740A includes a CatalogueModelCatalogueSchemaItemProperty entity 26744A, a CatalogueModelCatalogueSchemaSection entity 26746A, and a CatalogueModelCatalogueSchemaSectionRelationship entity 26748A. There is a 1:cn relationship 26750A between the CatalogueModelCatalogueSchema entity 26740A and the CatalogueModelCatalogueSchemaItemProperty entity 26744A. There is a 1:cn relationship 26752A between the CatalogueModelCatalogueSchema entity 26740A and the CatalogueModelCatalogueSchemaSection entity 26746A. There is a 1:cn relationship 26754A between the CatalogueModelCatalogueSchema entity 26740A and the CatalogueModelCatalogueSchemaSectionRelationship entity 26748A.

The CatalogueModelCatalogueSchemaSection entity 26746A includes a CatalogueModelCatalogueSchemaSectionPropertyValuation entity 26756A and a CatalogueModelCatalogueSchemaSectionItemProperty entity 26758A. There is a 1:cn relationship 26760A between the CatalogueModelCatalogueSchemaSection entity 26746A and the CatalogueModelCatalogueSchemaSectionPropertyValuation entity 26756A. There is a 1:cn relationship 26762A between the CatalogueModelCatalogueSchemaSection entity 26746A and the CatalogueModelCatalogueSchemaSectionItemProperty entity 26758A.

The CatalogueContent package 26764 includes a CatalogueContentCatalogueItem package 26764A and a CatalogueContentCatalogueView package 26766A.

The CatalogueContentCatalogueItem package 26764A includes a CatalogueContentCatalogueItem entity 26768A and a CatalogueContentCatalogueItemRelationship entity 26774A. There is a 1:cn relationship 26772A between the CatalogueContent entity 26794 and the CatalogueContentCatalogueItem entity 26768A. There is a 1:cn relationship 26774A between the CatalogueContent entity 26794 and the CatalogueContentCatalogueItemRelationship entity 26770A. The CatalogueContentCatalogueItem entity 26768A includes a CatalogueContentCatalogueItemDescription entity 26776A, a CatalogueContentCatalogueItemPropertyValuation entity 26778A, and a CatalogueContentCatalogueItemClassification entity 26780A. There is a 1:cn relationship 26782A between the CatalogueContentCatalogueItem entity 26768A and the CatalogueContentCatalogueItemDescription entity 26776A. There is a 1:cn relationship 26784A between the CatalogueContentCatalogueItem entity 26768A and the CatalogueContentCatalogueItemPropertyValuation entity 26778A. There is a 1:cn relationship 26786A between the CatalogueContentCatalogueItem entity 26768A and the CatalogueContentCatalogueItemClassification entity 26780A.

The CatalogueContentCatalogueView package 26766A includes a CatalogueContentCatalogueView entity 26788A. There is a 1:cn relationship 26790A between the CatalogueContent entity 26794 and the CatalogueContentCatalogueView entity 26788A.

The CatalogueContentCatalogueView entity 26788A includes a CatalogueContentCatalogueViewSchema entity 26792A, a CatalogueContentCatalogueViewItem entity 26794A, a CatalogueContentCatalogueViewItemRelationshipType entity 26796A, and a CatalogueContentCatalogueViewExcludedProperty entity 26798A. There is a 1:cn relationship 26700B between the CatalogueContentCatalogueView entity 26788A and the CatalogueContentCatalogueViewSchema entity 26792A. There is a 1:cn relationship 26702B between the CatalogueContentCatalogueView entity 26788A and the CatalogueContentCatalogueViewItem entity 26794A. There is a 1:cn relationship 26704B between the CatalogueContentCatalogueView entity 26788A and the CatalogueContentCatalogueViewItemRelationshipType entity 26796A. There is a 1:cn relationship 26706B between the CatalogueContentCatalogueView entity 26788A and the CatalogueContentCatalogueViewExcludedProperty entity 26798A.

The CatalogueContentCatalogueViewSchema entity 26792A includes a CatalogueContentCatalogueViewSchemaSection entity 26780A. There is a 1:cn relationship 26710B between the CatalogueContentCatalogueViewSchema entity 26792A and the CatalogueContentCatalogueViewSchemaSection entity 26780A.

The Business Object Model Operative package 26706 includes a BusinessTransactionDocument package 26712B, and a CataloguePublicationTransmission package 26714B.

The BusinessTransactionDocument package 26712B includes a BTDCreditWorthinessInformation package 26718B, a BTDCreditAgencyReportQueryService package 26720B, a BTDLegalInformation package 26722B, a BTDScheduling package 26724B, a BTDTransportInformation package 26726B, a BTDHandlingUnit package 26728B, a BTDLog package 26730B, a BTDFollowUpBusinessTransactionDocument package 26732B, a BTDFollowUpMessage package 26734B, a BTDLoanPaymentPlan package 26735B, a BTDItem package 26736B, a BTDPriceInformation package 26738B, a BTDPaymentInformation package 26740B, a BTDTax package 26742B, a BTDDeliveryInformation package 26744B, a BTDDeliveryExecutionInformation package 26746B, a BTDAccountingObjectSet package 26748B, a BTDBusinessDocumentObjectReference package 26750B, a BTDAttachment package 26752B, a BTDDescription package 26754B, a BTDParty package 26756B, a BTDLocation package 26758B, a BTDProductInformation package 26759B, a BTDLoanConditionInformation package 26760B, and a PersonnelTimeSubsheet package 26761B.

The BusinessTransactionDocument package 26712B also includes a BusinessTransactionDocument entity 26762B. The BusinessTransactionDocument entity 26762B is specialized into an InventoryChange entity 26764B, a SourceOfSupply entity 26766B, a CreditAgencyReportQuery entity 26768B, a CreditAgencyReport entity 26770B, a CreditWorthinessQuery entity 26772B, a CreditWorthiness entity 26774B, a ProductActivity entity 26776B, a ProductDemandInfluencingEvent entity 26778B, a ProductForecast entity 26780B, a RequestForQuotation (RFQ) entity 26782B, an RFQResult entity 26784B, a Quote entity 26786B, a SalesContract entity 26788B, a PurchaseContract entity 26790B, a SchedulingAgreement entity 26792B, a PurchaseRequirement entity 26794B, a PurchaseRequirementConfirmation entity 26796B, a PurchaseOrder entity 26798B, a SalesOrder entity 26700C, a SalesOrderFulfillment entity 26702C, a ServiceAcknowledgement entity 26704C, a DeliveryExecutionRequest entity 26706C, a Delivery entity 26708C, a Shipment entity 26710C, a PaymentDue entity 26712C, an InvoiceDue entity 26714C, an InvoiceDueCancellation entity 26716C, an Invoice entity 26718C, an InvoiceIssued entity 26720C, an InvoiceAccounting entity 26722C, an AccountingCancellation entity 26724C, a VendorInvoice entity 26726C, and a TaxDue entity 26728C, which are disjoint complete specializations 26730C of the BusinessTransactionDocument entity 26762B.

The ProductForecast entity 26780B is specialized into a ProductForecastNotification entity 26732C and a ProductForecastRevision entity 26734C, which are disjoint complete specializations 26736C of the ProductForecast entity 26780B.

The RFQ entity 26782B is specialized into a RFQUpdate entity 26738C and a RFQCancellation entity 26740C, which are nondisjoint complete specializations 26742C of the RFQ entity 26782B. The RFQUpdate entity 26738C is specialized into a RFQRequest entity 26744C and a RFQCharge entity 26746C, which are nondisjoint complete specializations 26748C of the RFQUpdate entity 26738C.

The PurchaseOrder entity 26798B is specialized into a PurchaseOrderUpdate entity 26750C, a PurchaseOrderCancellation entity 26752C, and a PurchaseOrderInformation entity 26754C, which are nondisjoint complete specializations 26756C of the PurchaseOrder entity 26798B. The PurchaseOrderUpdate entity 26750C is specialized into a PurchaseOrderRequest entity 26758C, a PurchaseOrderChange entity 26760C, and a PurchaseOrderConfirmation entity 26762C, which are nondisjoint complete specializations 26764C of the PurchaseOrderUpdate entity 26750C.

The Delivery entity 26708C is specialized into a PendingDelivery entity 26766C, an InboundDelivery entity 26768C, a ReceivedDelivery entity 26770C, a DeliveryInformation entity 26772C, and a DespatchedDeliveryNotification entity 26774C, which are nondisjoint complete specializations 26776C of the Delivery entity 26708C.

The AccountingCancellation entity 26724C is specialized into an InventoryChargeAccountingCancellation entity 26778C and an InvoiceAccountingCancellation entity 26780C, which are disjoint complete specializations 26782C of the AccountingCancellation entity 26724C.

The BTDCreditWorthinessInformation package 26718B includes a BTDCreditRating entity 26784C, a BTDCreditRiskClass entity 26786C, a BTDCreditAgencyReportScoring entity 26788C, and a BTDCreditLimit entity 26790C. There is a 1:1 relationship 26792C between the BusinessTransactionDocument entity 26762B and the BTDCreditRating entity 26784C. There is a 1:c relationship 26794C between the BusinessTransactionDocument entity 26762B and the BTDCreditRiskClass entity 26786C. There is a 1:cn relationship 26796C between the BusinessTransactionDocument entity 26762B and the BTDCreditAgencyReportScoring entity 26788C. There is a 1:cn relationship 26798C between the BusinessTransactionDocument entity 26762B and the BTDCreditLimit entity 26790C.

The BTDCreditAgencyReportQueryService package 26720B includes a CreditAgencyReportQueryService entity 26700D. There is a 1:1 relationship 26702D between the BusinessTransactionDocument entity 26762B and the CreditAgencyReportQueryService entity 26700D.

The BTDLegalInformation package 26722B includes a BTDLegalEvent entity 26704D. There is a 1:cn relationship 26706D between the BusinessTransactionDocument entity 26762B and the BTDLegalEvent entity 26704D.

The BTDScheduling package 26724B includes a BTDScheduling entity 26708D. There is a 1:c relationship 26710D between the BusinessTransactionDocument entity 26762B and the BTDScheduling entity 26708D.

The BTDTransportInformation package 26726B includes a BTDTransportMeans entity 26712D and a BTDTransportTracking entity 26714D. There is a 1:c relationship 26716D between the BusinessTransactionDocument entity 26762B and the BTDTransportMeans entity 26712D. There is a 1:c relationship 26718D between the BusinessTransactionDocument entity 26762B and the BTDTransportTracking entity 26714D.

The BTDHandlingUnit package 26728B includes a BTDHandlingUnit entity 26720D. There is a 1:cn relationship 26722D between the BusinessTransactionDocument entity 26762B and the BTDHandlingUnit entity 26720D.

The BTDLog package 26730B includes a BTDCreationLog entity 26724D. There is a 1:c relationship 26726D between the BusinessTransactionDocument entity 26762B and the BTDCreationLog entity 26724D. The BTDCreationLog entity 26724D includes a BTDCreationLogItem entity 26728D. There is a 1:n relationship 26730D between the BTDCreationLog entity 26724D and the BTDCreationLogItem entity 26728D.

The BTDFollowUpBusinessTransactionDocument package 26732B includes a BTDFollowUpPurchaseOrder entity 26732D and a BTDFollowUpPurchasingContract entity 26734D. There is a 1:c relationship 26736D between the BusinessTransactionDocument entity 26762B and the BTDFollowUpPurchaseOrder entity 26732D. There is a 1:c relationship 26738D between the BusinessTransactionDocument entity 26762B and the BTDFollowUpPurchasingContract entity 26734D.

The BTDFollowUpMessage package 26734B includes a BTDFollowUpPurchaseOrderConfirmation entity 26740D, a BTDFollowUpSalesOrderFulfillmentConfirmation entity 26742D, a BTDFollowUpServiceAcknowledgementRequest entity 26744D, a BTDFollowUpDespatchedDeliveryNotification entity 26746D, a BTDFollowUpInvoiceRequest entity 26748D, a BTDFollowUpBillingDueNotification entity 26750D, and a BTDFollowUpInvoiceDueNotification entity 26752D. There is a 1:c relationship 26754D between the BusinessTransactionDocument entity 26762B and the BTDFollowUpPurchaseOrderConfirmation entity 26740D. There is a 1:c relationship 26756D between the BusinessTransactionDocument entity 26762B and the BTDFollowUpSalesOrderFulfillmentConfirmation entity 26742D. There is a 1:c relationship 26758D between the BusinessTransactionDocument entity 26762B and the BTDFollowUpServiceAcknowledgementRequest entity 26744D. There is a 1:c relationship 26760D between the BusinessTransactionDocument entity 26762B and the BTDFollowUpDespatchedDeliveryNotification entity 26746D. There is a 1:c relationship 26761D between the BusinessTransactionDocument entity 26762B and the BTDFollowUpInvoiceRequest entity 26748D. There is a 1:c relationship 26762D between the BusinessTransactionDocument entity 26762B and the BTDFollowUpBillingDueNotification entity 26750D. There is a 1:c relationship 26763D between the BusinessTransactionDocument entity 26762B and the BTDFollowUpInvoiceDueNotification entity 26752D.

The BTDLoanPaymentPlan package 26735B includes a BTDLoanPaymentPlan entity 26764D. There is a 1:c relationship 26765D between the BusinessTransactionDocument entity 26762B and the BTDLoanPaymentPlan entity 26764D. The BTDLoanPaymentPlan entity 26764D includes a BTDLoanPaymentPlanItem entity 26766D. There is a 1:n relationship between the BTDLoanPaymentPlan entity 26764D and the BTDLoanPaymentPlanItem entity 26766D.

The BTDItem package 26736B includes a BTDItem entity 26768D. There is a 1:cn relationship between the BusinessTransactionDocument entity 26762B and the BTDItem entity 26768D. BTDItems are arranged hierarchically using a Hierarchy Relationship 26772D. The Hierarchy Relationship 26772D is the relationship between a sub-item and a higher-level parent item in an item hierarchy. There is a 1:cn relationship 26774D between the BTDItem entity 26768D and its subordinate entities, and a 1:c relationship 26776D between the BTDItem entity 26768D and its superordinate entities.

The BTDItem entity 26768D is specialized into an InventoryChangeItem entity 26778D, a ProductActivityItem entity 26780D, an InvoiceAccountingItem entity 26782D, a ProductDemandInfluencingEventItem entity 26784D, a ProductForecastItem entity 26786D, a RequestForQuotationItem entity 26788D, an RFQResultItem entity 26790D, a QuoteItem entity 26792D, a PurchaseRequirementItem entity 26794D, a PurchaseRequirementConfirmationItem entity 26796D, a PurchaseOrderItem entity 26798D, a SalesOrderFulfillmentItem entity 26700E, a ServiceAcknowledgementItem entity 26702E, a DeliveryExecutionRequestItem entity 26704E, a DeliveryItem entity 26706E, a PaymentDueItem entity 26708E, an InvoiceDueItem entity 26710E, an InvoiceItem entity 26712E, a TaxDueItem entity 26714E, an InvoiceIssuedItem entity 26716E, which are disjoint complete specializations 26718E of the BTDItem entity 26768D.

The InvoiceAccountingItem entity 26782D is specialized into an InvoiceAccountingExpenseRevenueItem entity 26720E, an InvoiceAccountingDueItem entity 26722E, and an InvoiceAccountingTaxItem entity 26724E, which are disjoint complete specializations 26726E of the InvoiceAccountingItem entity 26782D.

The ProductForecastItem entity 26786D is specialized into a ProductForecastNotificationItem entity 26728E and a ProductForecastRevisionItem entity 26730E, which are disjoint complete specializations 26732E of the ProductForecastItem entity 26786D.

The PurchaseOrderItem entity 26798D is specialized into a PurchaseOrderInformationItem entity 26734E, which is a disjoint complete specialization 26736E of the ProductForecastItem entity 26798D.

The DeliveryItem entity 26706E is specialized into a DespatchedDeliveryItem entity 26738E, a ReceivedDeliveryItem entity 26740E, and a DeliveryInformationItem entity 26742E, which are disjoint complete specializations 26744E of the DeliveryItem entity 26706E.

The BTDItem package 26736B includes a BTDItemScheduleLine package 26746E. The BTDItemScheduleLine package 26746E includes a BTDItemScheduleLine entity 26762E. There is a 1:cn relationship 26764E between the BTDItem entity 26768D and the BTDItemScheduleLine entity 26762E.

The BTDItemScheduleLine entity 26762E includes a BTDItemScheduleLineDeliveryPeriod entity 26770E. There is a 1:c relationship 26772E between the BTDItemScheduleLine entity 26762E and the BTDItemScheduleLineDeliveryPeriod entity 26770E. The BTDItemScheduleLine entity 26762E is specialized into a BTDConfirmedScheduleLine entity 26766E, which is a disjoint incomplete specialization 26768E of the BTDItemScheduleLine entity 26762E.

The BTDItem package 26736B also includes a BTDIBatch package 26748E, a BTDIRelease package 26750E, a BTDIPromotion package 26752E, a BTDIInventory package 26754E, a PurchaseRequirementConfirmationItemExecutingPurchaseOrder package 26756E, an InventoryChangeItemInbound package 26758E, and an InventoryChangeItemOutbound package 26760E. The BTDIBatch package 26748E includes a BTDIBatch entity 26774E. There is a 1:c relationship 26776E between the BTDItem entity 26768D and the BTDIBatch entity 26774E.

The BTDIRelease package 26750E includes a BTDIRelease entity 26778E and a BTDIPreviousRelease entity 26780E. There is a 1:c relationship 26782E between the BTDItem entity 26768D and the BTDIRelease entity 26778E. There is a 1:c relationship 26784E between the BTDItem entity 26768D and the BTDIPreviousRelease entity 26780E. The BTDIPromotion entity 26752E includes a BTDIPromotion entity 26786E. There is a 1:c relationship 26788E between the BTDItem entity 26768D and the BTDIPromotion entity 26786E. The BTDIInventory package 26754E includes a BTDIInventory entity 26790E and a BTDIConsignmentInventory entity 26792E. There is a 1:c relationship 26794E between the BTDItem entity 26768D and the BTDIInventory entity 26790E. There is a 1:c relationship 26796E between the BTDItem entity 26768D and the BTDIConsignmentInventory entity 26792E. The PurchaseRequirementConfirmationItemExecutingPurchaseOrder package 26756E includes a PurchaseRequirementConfirmationItemExecutingPurchaseOrder entity 26798E. There is a 1:cn relationship 26700F between the BTDItem entity 26768D and the PurchaseRequirementConfirmationItemExecutingPurchaseOrder entity 26798E. The InventoryChangeItemInbound package 26758E includes an InventoryChangeItemInbound entity 26702F. There is a 1:c relationship 26704F between the BTDItem entity 26768D and the InventoryChangeItemInbound entity 26702F. The InventoryChangeItemOutbound package 26760E includes an InventoryChangeItemOutbound entity 26706F. There is a 1:c relationship 26708F between the BTDItem entity 26768D and the InventoryChangeItemOutbound entity 26706F.

The BTDPriceInformation package 26738B includes a BTDProcurementCostUpperLimit entity 26710F, a BTDPrice entity 26712F and a BTDConfirmedPrice entity 26714F. There is a 1:c relationship 26716F between the BTDItem entity 26768D and the BTDProcurementCostUpperLimit entity 2671 OF. There is a 1:c relationship 26718F between the BTDItem entity 26768D and the BTDPrice entity 26712F. There is a 1:cn relationship 26720F between the BusinessTransactionDocument entity 26762B and the BTDPrice entity 26712F. There is a 1:c relationship 26722F between the BTDItem entity 26768D and the BTDConfirmedPrice entity 26714F. The BTDPrice entity 26712F includes a BTDPriceComponent entity 26724F and a BTDPriceScale entity 26726F. There is a 1:cn relationship 26728F between the BTDPrice entity 26712F and the BTDPriceComponent entity 26724F. There is a 1:c relationship 26730F between the BTDPrice entity 26712F and the BTDPriceScale entity 26726F. The BTDPriceScale entity 26726F includes a BTDPriceScaleLine entity 26732F. There is a 1:n relationship 26734F between the BTDPriceScale entity 26726F and the BTDPriceScaleLine entity 26732F.

The BTDPaymentInformation package 26740B includes a BTDCashDiscountTerms entity 26736F and a BTDPaymentForm entity 26738F. There is a 1:c relationship 26740F between the BTDItem entity 26768D and the BTDCashDiscountTerms entity 26736F. There is a 1:c relationship 26742F between the BTDCashDiscountTerms entity 26736F and the BTDItem entity 26768D. There is a 1:c relationship 26744F between the BusinessTransactionDocument entity 26762B and the BTDCashDiscountTerms entity 26736F. There is a 1:c relationship 26746F between the BTDItem entity 26768D and the BTDPaymentForm entity 26738F. There is a 1:c relationship 26748F between the BTDPaymentForm entity 26738F and the BTDItem entity 26768D. There is a 1:c relationship 26750F between the BusinessTransactionDocument entity 26762B and the BTDPaymentForm entity 26738F.

The BTDTax package 26742B includes a BTDProductTax entity 26764F. There is a 1:cn relationship 26766F between the BTDItem entity 26768D and the BTDProductTax entity 26764F. There is a 1:cn relationship 26768F between the BusinessTransactionDocument entity 26762B and the BTD-ProductTax entity 26764F.

The BTDDeliveryInformation package 26744B includes a BTDDeliveryTerms entity 26770F, a DeliveryItemVariance entity 26772F, and a BTDDeliveryControl entity 26774F. There is a 1:c relationship 26776F between the BTDItem entity 26768D and the BTDDeliveryTerms entity 26770F. There is a 1:c relationship 26778F between the BTDDeliveryTerms entity 26770F and the BTDItem entity 26768D. There is a 1:c relationship 26780F between the BusinessTransactionDocument entity 26762B and the BTDDeliveryTerms entity 26770F. There is a 1:cn relationship 26782F between the BTDItem entity 26768D and the DeliveryItem-Variance entity 26772F. There is a 1:c relationship 26784F between the BTDItem entity 26768D and the BTDDelivery-Control entity 26774F. There is a 1:c relationship 26786F between the BTDDeliveryControl entity 26774F and the BTDItem entity 26768D. There is a 1:c relationship 26788F between the BusinessTransactionDocument entity 26762B and the BTDDeliveryControl entity 26774F.

The BTDDeliveryTerms entity 26770F includes a BTD-DeliveryTermsIncoterms entity 26790F, a BTDDelivery-TermsPartialDelivery entity 26792F, a BTDDeliveryTermsQuantityTolerance entity 26794F, a BTDDeliveryTermsTransport entity 26796F, and a BTDDeliveryTermsDescription entity 26798F. There is a 1:cn relationship 26700G between the Incoterms entity 26710 and the BTDDeliveryTermsIncoterms entity 26790F. There is a 1:c relationship 26702G between the BTDDeliveryTerms entity 26770F and the BTDDeliveryTermsIncoterms entity 26790F. There is a 1:c relationship 26704G between the BTDDeliveryTerms entity 26770F and the BTDDeliveryTermsPartialDelivery entity 26792F. There is a 1:c relationship 26706G between the BTDDeliveryTerms entity 26770F and the BTDDeliveryTermsQuantityTolerance entity 26794F. There is a 1:c relationship 26708G between the BTDDeliveryTerms entity 26770F and the BTDDeliveryTermsTransport entity 26796F. There is a 1:c relationship 26710G between the BTDDeliveryTerms entity 26770F and the BTD-DeliveryTermsDescription entity 26798F.

The BTDDeliveryExecutionInformation package 26746B includes a DeliveryExecutionPeriod entity 26712G and a DeliveryExecutionStatus entity 26714G. There is a 1:cn relationship 26716G between the BTDItem entity 26768D and the DeliveryExecutionPeriod entity 26712G. There is a 1:c relationship 26718G between the DeliveryExecutionPeriod entity 26712G and the BTDItem entity 26768D. There is a 1:cn relationship 26720G between the BusinessTransaction-Document entity 26762B and the DeliveryExecutionPeriod entity 26712G. There is a 1:cn relationship 26722G between the BTDItem entity 26768D and the DeliveryExecutionStatus entity 26714G. There is a 1:c relationship 26723G between the DeliveryExecutionStatus entity 26714G and the BTDItem entity 26768D. There is a 1:cn relationship 26724G between the BusinessTransactionDocument entity 26762B and the DeliveryExecutionStatus entity 26714G.

The BTDAccountingObjectSet package 26748B includes a BTDAccountingObjectSet entity 26726G. There is a 1:c relationship 26728G between the BTDItem entity 26768D and the BTDAccountingObjectSet entity 26726G.

The BTDBusinessDocumentObjectReference package 26750B includes a BTDRequestForQuotationReference entity 26730G, a BTDSchedulingAgreementReference entity 26732G, a BTDSellerProductCatalogueReference entity 26734G, a BTDBuyerProductCatalogueReference entity 26736G, a BTDPurchasingContractReference entity 26738G, a BTDSalesContractReference entity 26740G, a BTDOriginPurchaseOrderReference entity 26742G, a BTD-QuoteReference entity 26744G, a BTDPurchaseOrderReference entity 26746G, a BTDSalesOrderReference entity 26748G, a BTDServiceAcknowledgementReference entity 26750G, a BTDPendingDeliveryReference entity 26752G, a BTDDeliveryReference entity 26754G, a BTDInboundDeliveryReference entity 26756G, a BTDDespatchedDelivery-NotificationReference entity 26758G, a BTDShipmentReference entity 26760G, a BTDOriginInvoiceReference entity 26762G, a BTDOriginVendorInvoiceReference entity 26764G, a BTDPrimaNotaReference entity 26766G, and a BTDOriginPrimaNotaReference entity 26768G. There is a 1:c relationship 26770G between the BusinessTransaction-Document entity 26762B and the BTDRequestForQuotation-Reference entity 26730G. There is a 1:cn association 26772G between the RFQ Specialization 26782B and the BTDRequestForQuotationReference entity 26730G. There is a 1:c relationship 26774G between the BTDItem entity 26768D and the BTDSchedulingAgreementReference entity 26732G, and a 1:c relationship 26776G between the BTD-SchedulingAgreementReference entity 26732G and the BTDItem entity 26768D. There is a 1:c relationship 26778G between the BusinessTransactionDocument entity 26762B and the BTDSchedulingAgreementReference entity 26732G. There is a 1:cn association 26780G between the SchedulingAgreement entity 26792B and the BTDSchedulingAgreementReference entity 26732G. There is a 1:c relationship 26782G between the BTDItem entity 26768D and the BTDSellerProductCatalogueReference entity 26734G. There is a 1:cn association 26784G between the SellerProductCatalogue entity 26782 and the BTDSellerProductCatalogueReference entity 26734G. There is a 1:c relationship 26786G between the BTDItem entity 26768D and the BTD-BuyerProductCatalogueReference entity 26736G. There is a 1:cn association 26788G between the BuyerProductCatalogue entity 26780 and the BTDBuyerProductCatalogueReference entity 26736G. There is a 1:cn relationship 26790G between the BTDItem entity 26768D and the BTDPurchasingContractReference entity 26738G, and a 1:c relationship 26792G between the BTDPurchasingContractReference entity 26738G and the BTDItem entity 26768D. There is a 1:c relationship 26794G between the BusinessTransactionDocument entity 26762B and the BTDPurchasingContractReference entity 26738G. There is a 1:cn association 26796G between the PurchaseContract entity 26790B and the BTD-PurchasingContractReference entity 26738G. There is a 1:cn relationship 26798G between the BTDItem entity 26768D and the BTDSalesContractReference entity 26740G. There is a 1:cn association 26700H between the SalesContract entity 26788B and the BTDSalesContractReference entity 26740G. There is a 1:c relationship 26702H between the BTDItem entity 26768D and the BTDOriginPurchaseOrderReference entity 26742G. There is a 1:cn association 26704H between the PurchaseOrderRequest entity 26758C and the BTDOriginPurchaseOrderReference entity 26742G.

There is a 1:c relationship 26706H between the BTDItem entity 26768D and the BTDQuoteReference entity 26744G, and a 1:c relationship 26708H between the BTDQuoteReference entity 26744G and the BTDItem entity 26768D. There is a 1:c relationship 26710H between the BusinessTransaction-Document entity 26762B and the BTDQuoteReference entity 26744G. There is a 1:cn association 26712H between the Quote entity 26786B and the BTDQuoteReference entity 26744G. There is a 1:cn relationship 26714H between the BTDItem entity 26768D and the BTDPurchaseOrderReference entity 26746G. There is a 1:cn association 26716H between the PurchaseOrderRequest entity 26758C and the BTDPurchaseOrderReference entity 26746G. There is a 1:cn relationship 26718H between the BTDItem entity 26768D and the BTDSalesOrderReference entity 26748G. There is a 1:cn association 26720H between the SalesOrder entity 26700C and the BTDSalesOrderReference entity 26748G. There is a 1:c relationship 26722H between the BTDItem entity 26768D and the BTDServiceAcknowledgementReference entity 26750G. There is a 1:cn association 26724H between the ServiceAcknowledgement entity 26704C and the BTDServiceAcknowledgementReference entity 26750G. There is a 1:cn relationship 26726H between the BTDItem entity 26768D and the BTDPendingDeliveryReference entity 26752G. There is a 1:cn association 26728H between the PendingDelivery entity 26766C and the BTDPendingDeliveryReference entity 26752G. There is a 1:c relationship 26730H between the BTDItem entity 26768D and the BTDDeliveryReference entity 26754G. There is a 1:cn association 26732H between the Delivery Specialization 26708C and the BTDDeliveryReference entity 26754G. There is a 1:cn relationship 26734H between the BusinessTransactionDocument entity 26762B and the BTDInboundDeliveryReference entity 26756G. There is a 1:cn association 26736H between the InboundDelivery entity 26768C and the BTDInboundDeliveryReference entity 26756G.

There is a 1:c relationship 26738H between the BTDItem entity 26768D and the BTDDespatchedDeliveryNotificationReference entity 26758G, and a 1:c relationship 26740H between the BTDDespatchedDeliveryNotificationReference entity 26758G and the BTDItem entity 26768D. There is a 1:c relationship 26742H between the BusinessTransactionDocument entity 26762B and the BTDDespatchedDeliveryNotificationReference entity 26758G. There is a 1:cn association 26744H between the DespatchedDeliveryNotification entity 26774C and the BTDDespatchedDeliveryNotificationReference entity 26758G. There is a 1:c relationship 26746H between the BTDItem entity 26768D and the BTDShipmentReference entity 26760G, and a 1:c relationship 26748H between the BTDShipmentReference entity 26760G and the BTDItem entity 26768D. There is a 1:c relationship 26750H between the BusinessTransactionDocument entity 26762B and the BTDShipmentReference entity 26760G. There is a 1:cn association 26752H between the Shipment entity 26710C and the BTDShipmentReference entity 26760G. There is a 1:c relationship 26754H between the BTDItem entity 26768D and the BTDOriginInvoiceReference entity 26762G. There is a 1:cn association 26756H between the Invoice entity 26718C and the BTDOriginInvoiceReference entity 26762G. There is a 1:c relationship 26758H between the BusinessTransactionDocument entity 26762B and the BTDOriginVendorInvoiceReference entity 26764G. There is a 1:c association 26760H between the VendorInvoice entity 26726C and the BTDOriginVendorInvoiceReference entity 26764G. There is a 1:c relationship 26762H between the BusinessTransactionDocument entity 26762B and the BTDPrimaNotaReference entity 26766G. There is a 1:c relationship 26764H between the BusinessTransactionDocument entity 26762B and the BTDOriginPrimaNotaReference entity 26768G.

The BTDAttachment package 26752B includes a BTDAttachment entity 26766H, a BTDAttachmentWebAddress entity 26768H, and a BTDIntemetAttachmentWebAddress entity 26770H. There is a 1:cn relationship 26772H between the BTDItem entity 26768D and the BTDAttachment entity 26766H, and a 1:c relationship 26774H between the BTDAttachment entity 26766H and the BTDItem entity 26768D. There is a 1:cn relationship 26776H between the BusinessTransactionDocument entity 26762B and the BTDAttachment entity 26766H. There is a 1:cn association 26778H between the Attachment entity 26758 and the BTDAttachment entity 26766H. There is a 1:cn relationship 26780H between the BTDItem entity 26768D and the BTDAttachmentWebAddress entity 26768H. There is a 1:cn relationship 26782H between the BusinessTransactionDocument entity 26762B and the BTDAttachmentWebAddress entity 26768H. There is a 1:cn relationship 26784H between the BTDItem entity 26768D and the BTDIntemetAttachmentWebAddress entity 26770H. There is a 1:cn relationship 26786H between the BusinessTransactionDocument entity 26762B and the BTDIntemetAttachmentWebAddress entity 26770H.

The BTDDescription package 26754B includes a BTDDescription entity 26788H, a BTDIntemalWebAddress entity 26790H, and a BTDConfirmationDescription entity 26792H. There is a 1:cn relationship 26794H between the BTDItem entity 26768D and the BTDDescription entity 26788H. There is a 1:c relationship 26796H between the BTDDescription entity 26788H and the BTDItem entity 26768D. There is a 1:cn relationship 26798H between the BusinessTransactionDocument entity 26762B and the BTDDescription entity 26788H. There is a 1:c relationship 26700I between the BTDItem entity 26768D and the BTDIntemalWebAddress entity 26790H. There is a 1:c relationship 26702I between the BTDIntemalWebAddress entity 26790H and the BTDItem entity 26768D. There is a 1:c relationship 26704I between the BusinessTransactionDocument entity 26762B and the BTDIntemalWebAddress entity 26790H. There is a 1:c relationship 26706I between the BTDItem entity 26768D and the BTDConfirmationDescription entity 26792H. There is a 1:c relationship 26708I between the BTDConfirmationDescription entity 26792H and the BTDItem entity 26768D. There is a 1:c relationship 26710I between the BusinessTransactionDocument entity 26762B and the BTDConfirmationDescription entity 26792H.

Figure 267F:
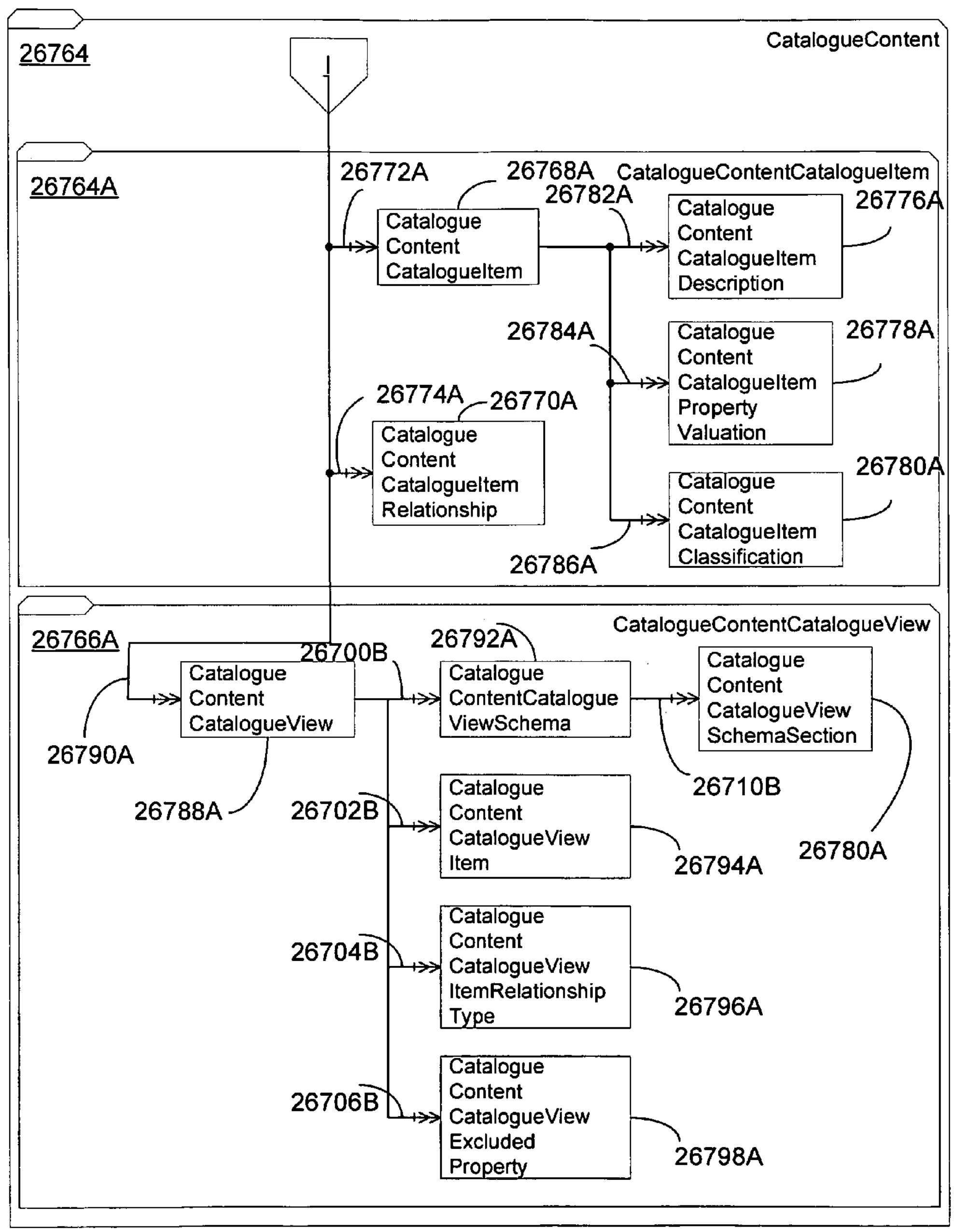
Figure 267G:
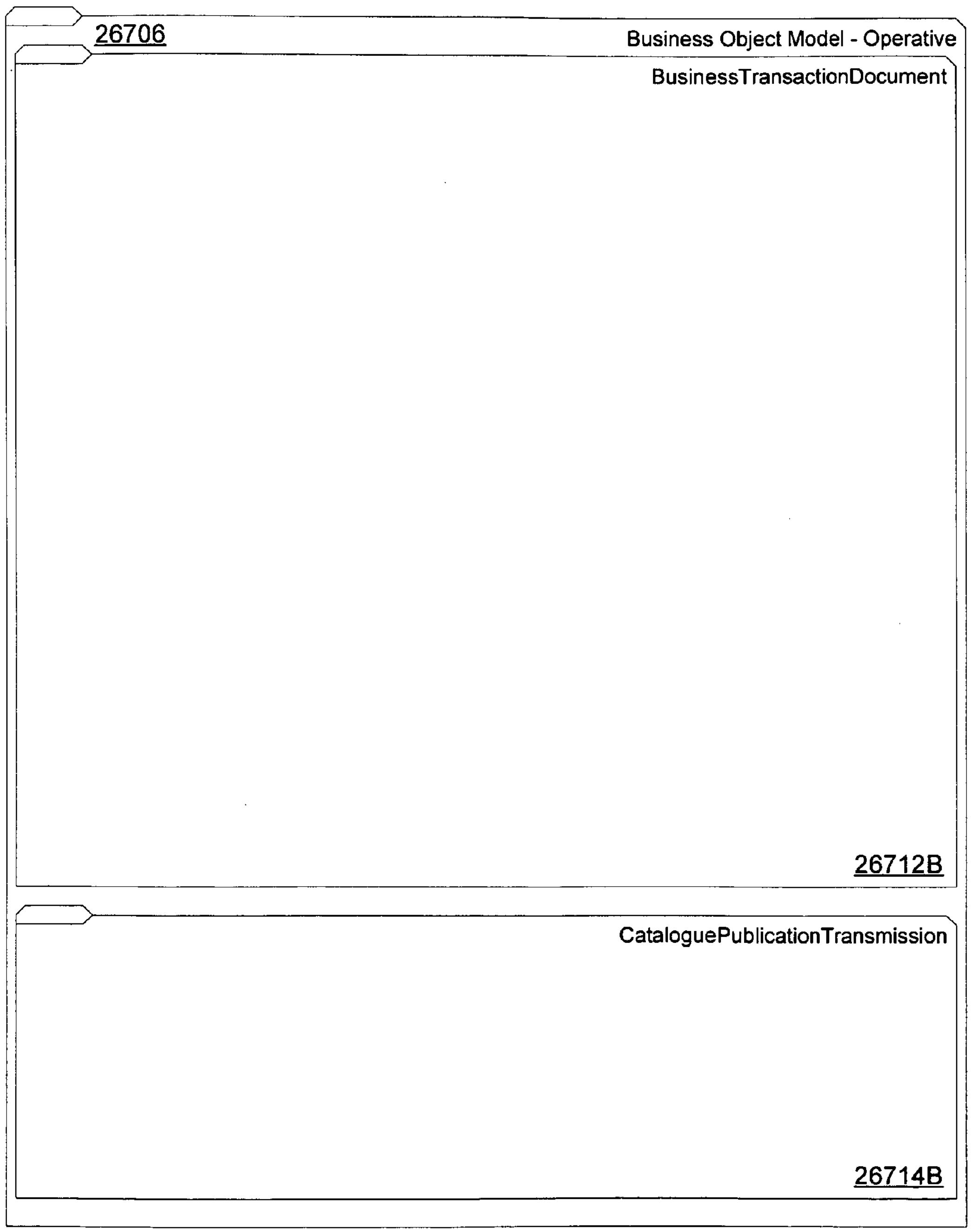
Figure 267H:
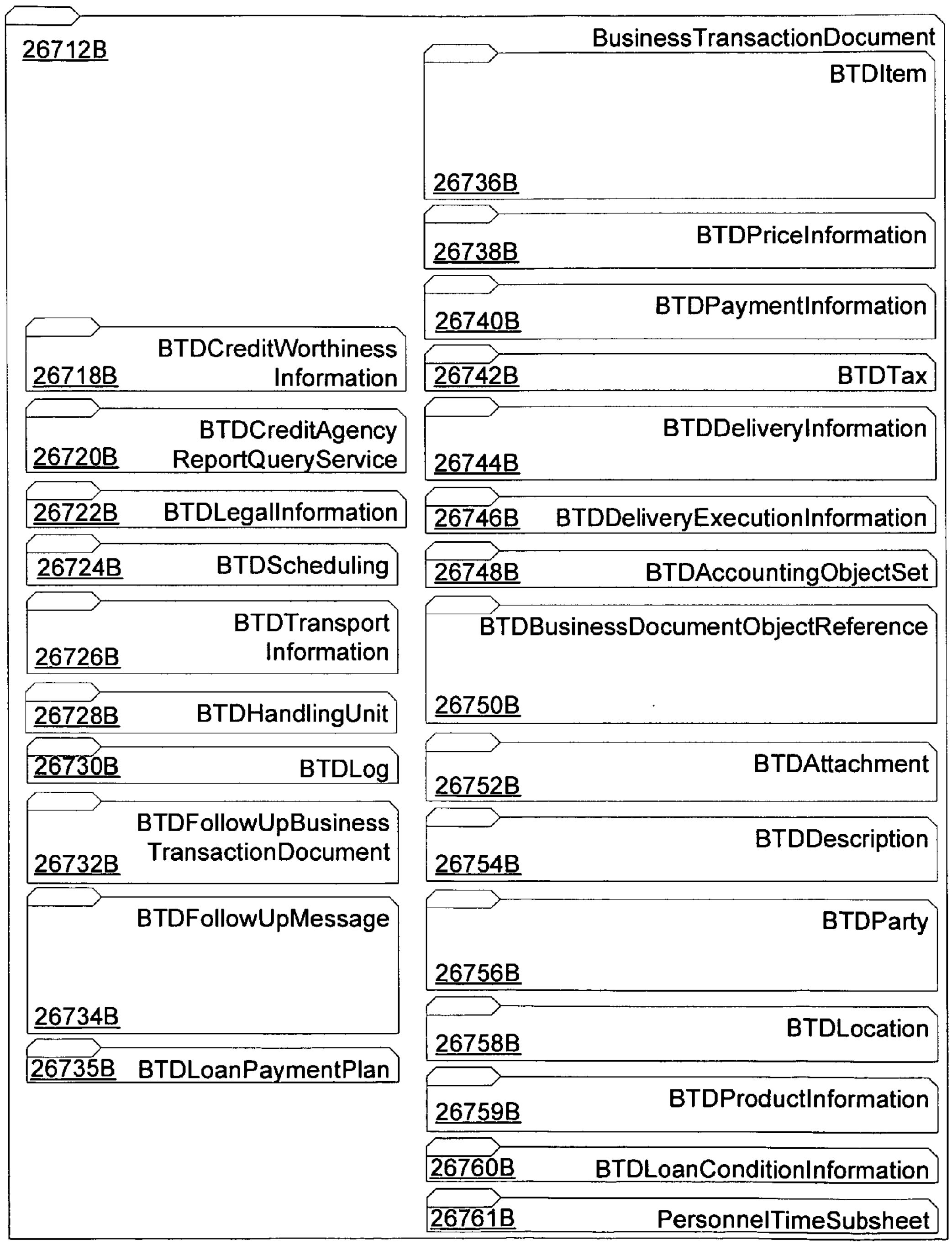

The BTDParty package 26756B includes a BTDParty entity 26712I. The details regarding the relationships 26713I to the BTDParty entity 26712I are depicted in FIG. 267FF. There is a 1:1 relationship 26714I between the InventoryChangeItemInbound entity 26702F and the BTDParty entity 26712I, and a 1:c relationship 26716I between the BTDParty entity 26712I and the InventoryChangeItemInbound entity 26702F. There is a 1:1 relationship 26718I between the InventoryChangeItemOutbound entity 26706F and the BTDParty entity 26712I, and a 1:c relationship 26720I between the BTDParty entity 26712I and the InventoryChangeItemOutbound entity 26706F. There is a 1:cn relationship 26722I between the BTDItem entity 26768D and the BTDParty entity 26712I, and a 1:c relationship 26724I between the BTDParty entity 26712I and the BTDItem entity 26768D. There is a 1:cn relationship 26726I between the BusinessTransactionDocument entity 26762B and the BTDParty entity 26712I.

The BTDParty entity 26712I includes a BTDPartyContactPerson entity 26728I and a BTDPartyAddress entity 26730I. There is a 1:c relationship 26732I between the BTDParty entity 26712I and the BTDPartyContactPerson entity 26728I. There is a 1:c relationship 26734I between the BTDParty entity 26712I and the BTDPartyAddress entity 26730I. There is a 1:cn relationship 26736I between the BusinessTransactionDocument entity 26762B and the BTDPartyAddress entity 26730I.

The BTDParty entity 26712I is specialized into a BTDBuyerParty entity 26744I, a BTDCreditorParty entity 26746I, a BTDSellerParty entity 26748I, a BTDDebtorParty entity 26750I, a BTDProductRecipientParty entity 26752I, a BTDVendorParty entity 26754I, a BTDManufacturerParty entity 26756I, a BTDPayerParty entity 26758I, a BTDPayeeParty entity 26760I, a BTDBillToParty entity 26762I, a BTDBillFromParty entity 26764I, a BTDCarrierParty entity 26766I, a BTDRequestorParty entity 26767I, a BRDPortalProviderParty entity 26768I, a BTDCatalogueProvider entity 26769I, a BTDBidderParty entity 26770I, a BTDOwnerParty entity 26771I, a BTDTaxPayerParty entity 26772I, a BTDTaxAuthorityParty 26773I, a BTDTaxOperatorParty 26774I, a BTDContractReleaseAuthorisedParty 26775I, a BTDProposedSellerParty 26776I, and a BTDBidderPortalProviderParty 26777I, which are nondisjoint complete specializations 26778I of the BTDParty entity 26712I.

Figure 267I:
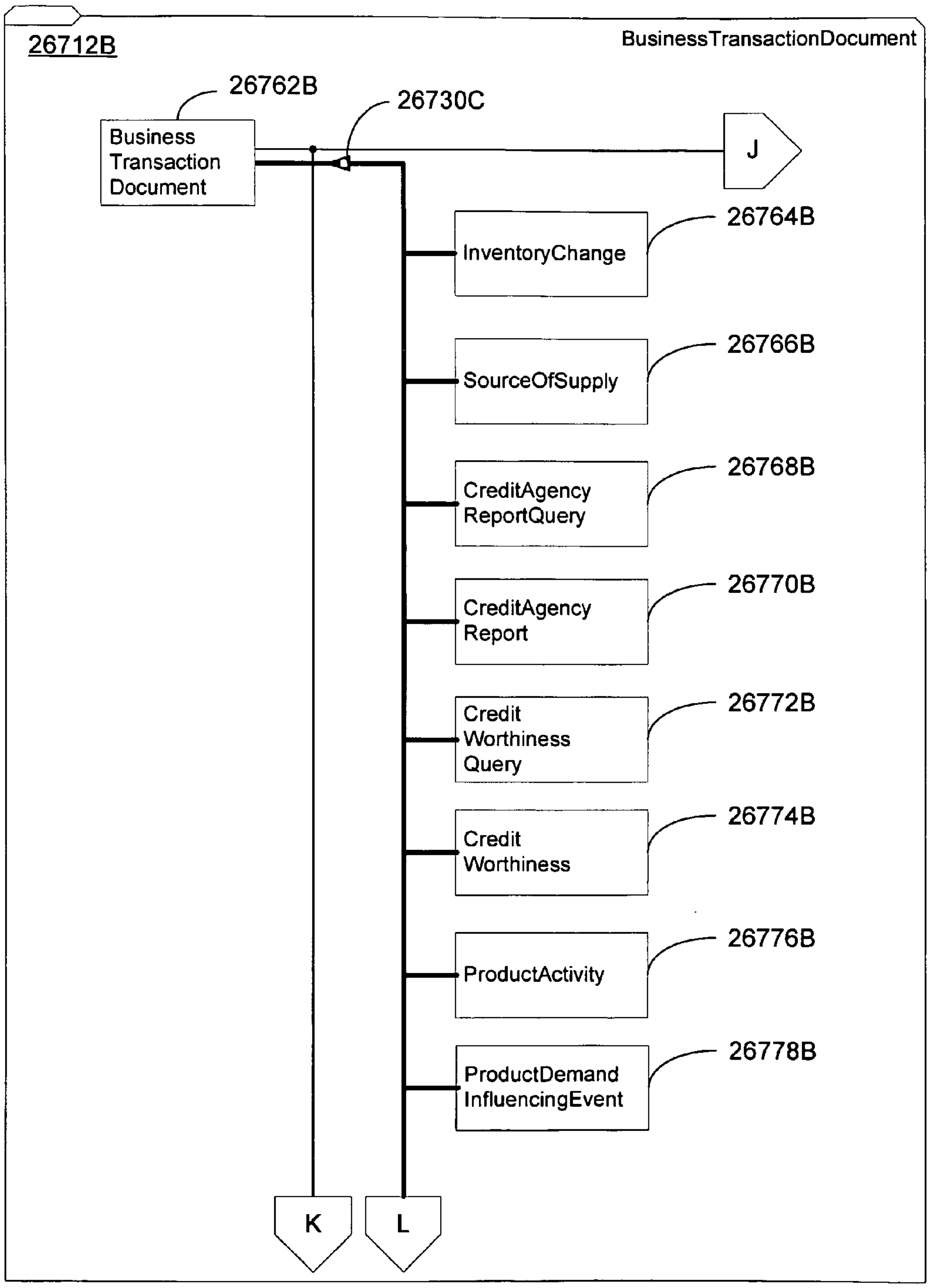

The BTDLocation package 26758B includes a BTDLocation entity 26780I. The details regarding the relationships 26781I to the BTDLocation entity 26780I are depicted in FIG. 267II. There is a 1:cn relationship 26782I between the InventoryChangeItemInbound entity 26702F and the BTDLocation entity 26780I, and a 1:c relationship 26784I between the BTDLocation entity 26780I and the InventoryChangeItemInbound entity 26702F. There is a 1:cn relationship 26786I between the InventoryChangeItemOutbound entity 26706F and the BTDLocation entity 26780I, and a 1:c relationship 26788I between the BTDLocation entity 26780I and the InventoryChangeItemOutbound entity 26706F. There is a 1:cn relationship 26790I between the BTDItem entity 26768D and the BTDLocation entity 26780I, and a 1:c relationship 26792I between the BTDLocation entity 26780I and the BTDItem entity 26768D. There is a 1:cn relationship 26794I between the BusinessTransactionDocument entity 26762B and the BTDLocation entity 26780I.

The BTDLocation entity 26780I includes a BTDLocationAddress entity 26796I. There is a 1:cn relationship 26798I between the Address entity 26737 and the BTDLocationAddress entity 26796I. There is a 1:c relationship 26700J between the BTDLocation entity 26780I and the BTDLocationAddress entity 26796I. The BTDLocation entity 26780I is specialized into a BTDShipToLocation entity 26702J and a BTDShipFromLocation entity 26704J, which are nondisjoint incomplete specializations 26706J of the BTDLocation entity 26780I.

Figure 267J:
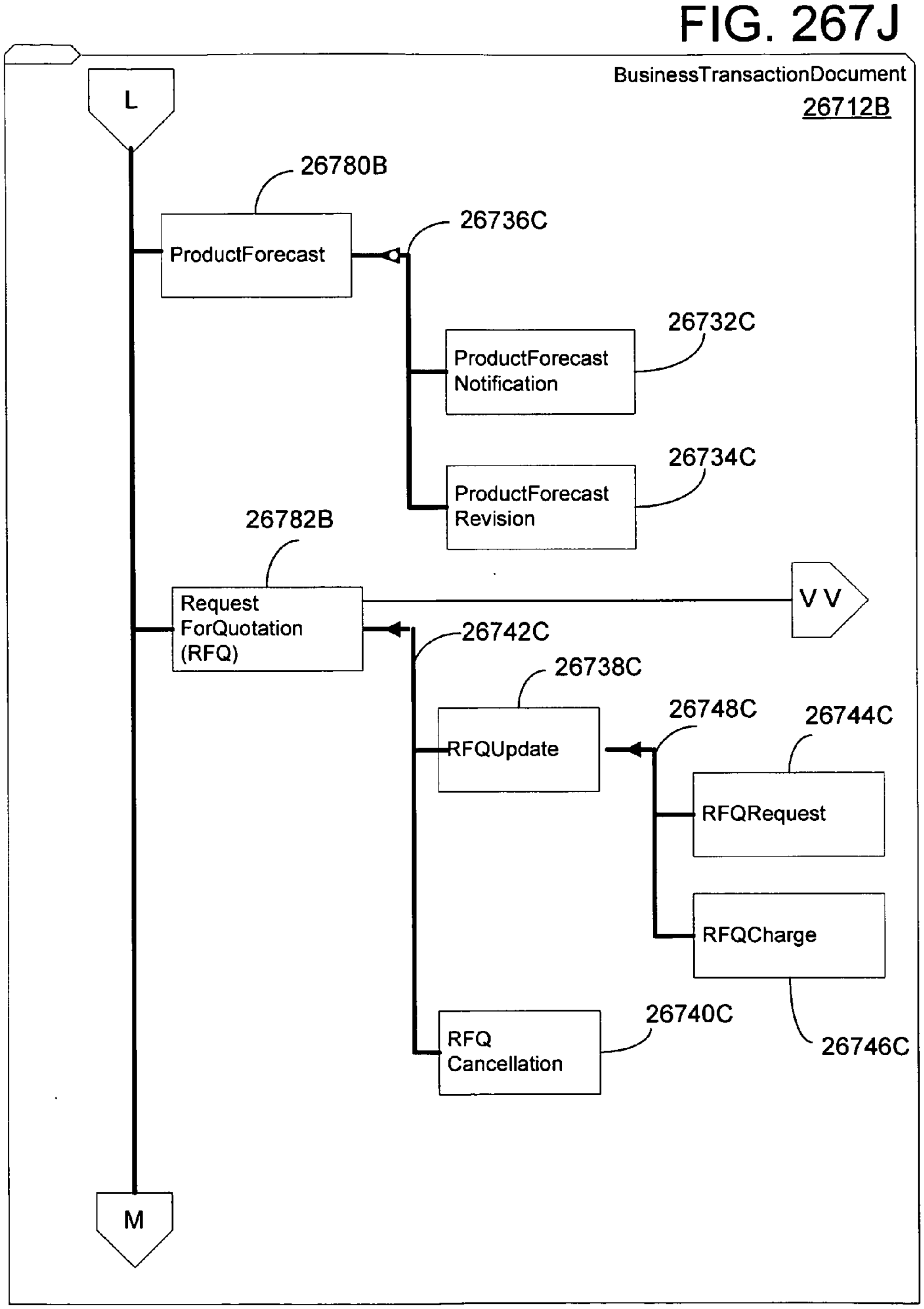
Figure 267K:
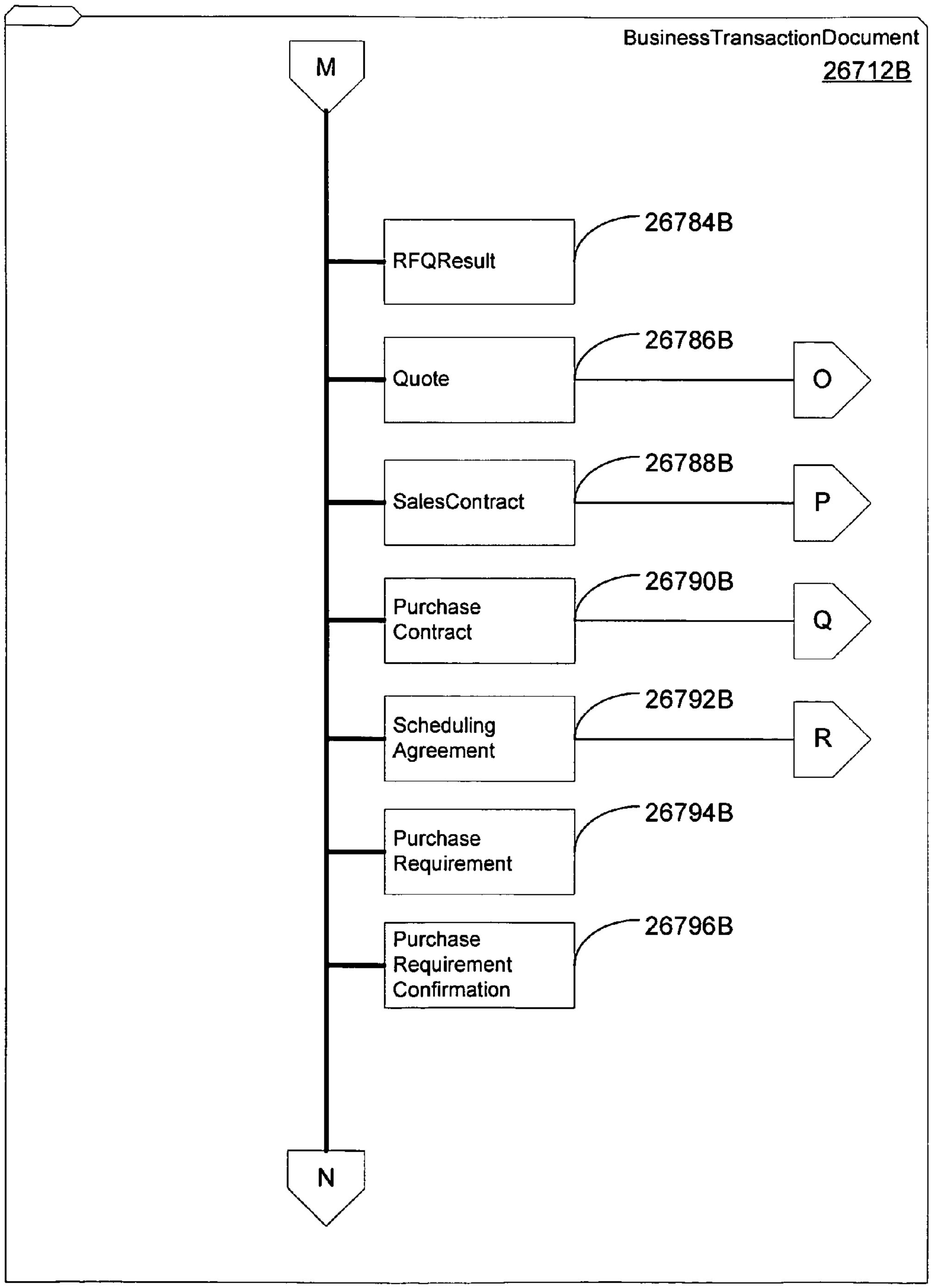
Figure 267L:
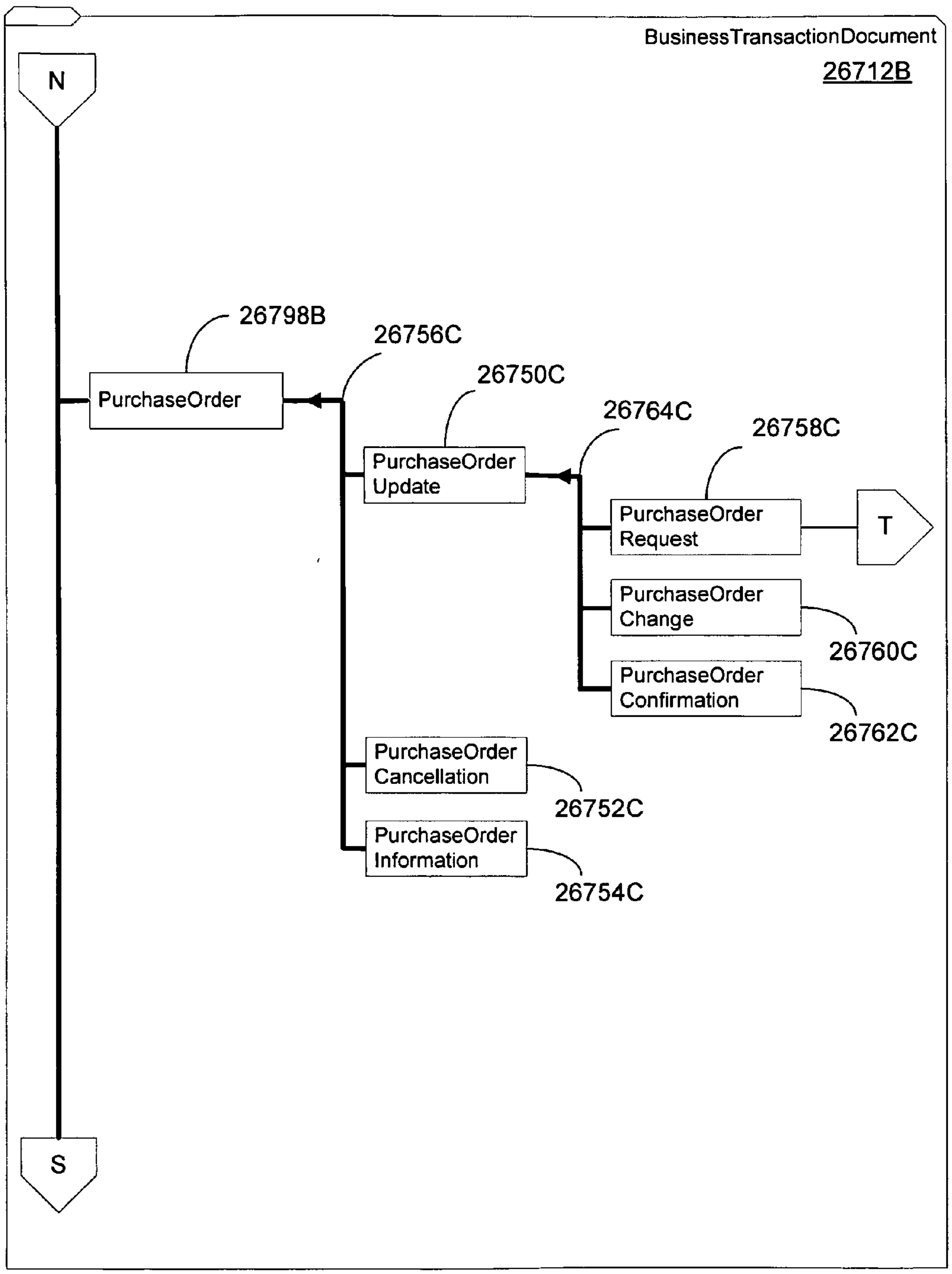
Figure 267M:
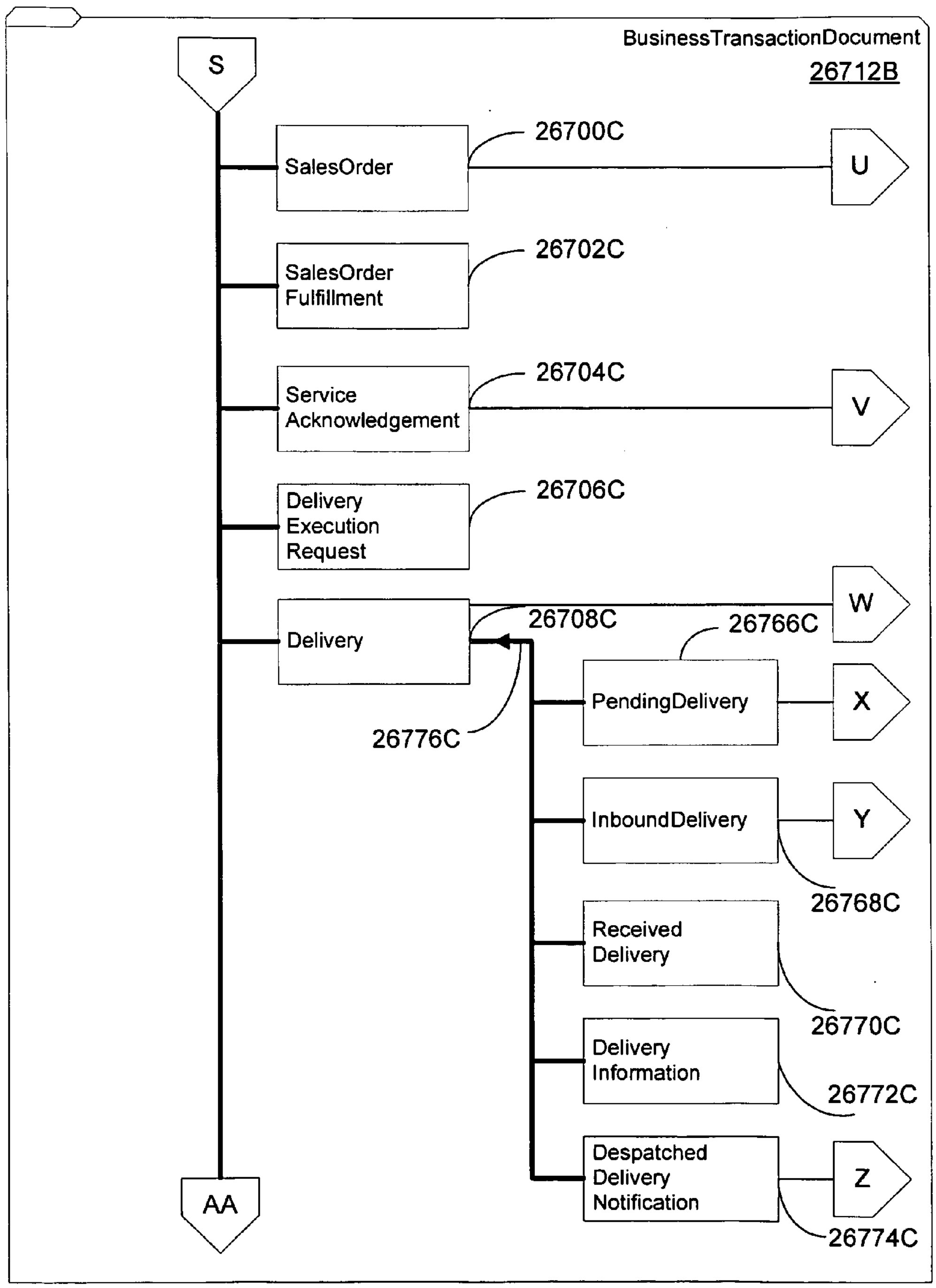
Figure 267N:
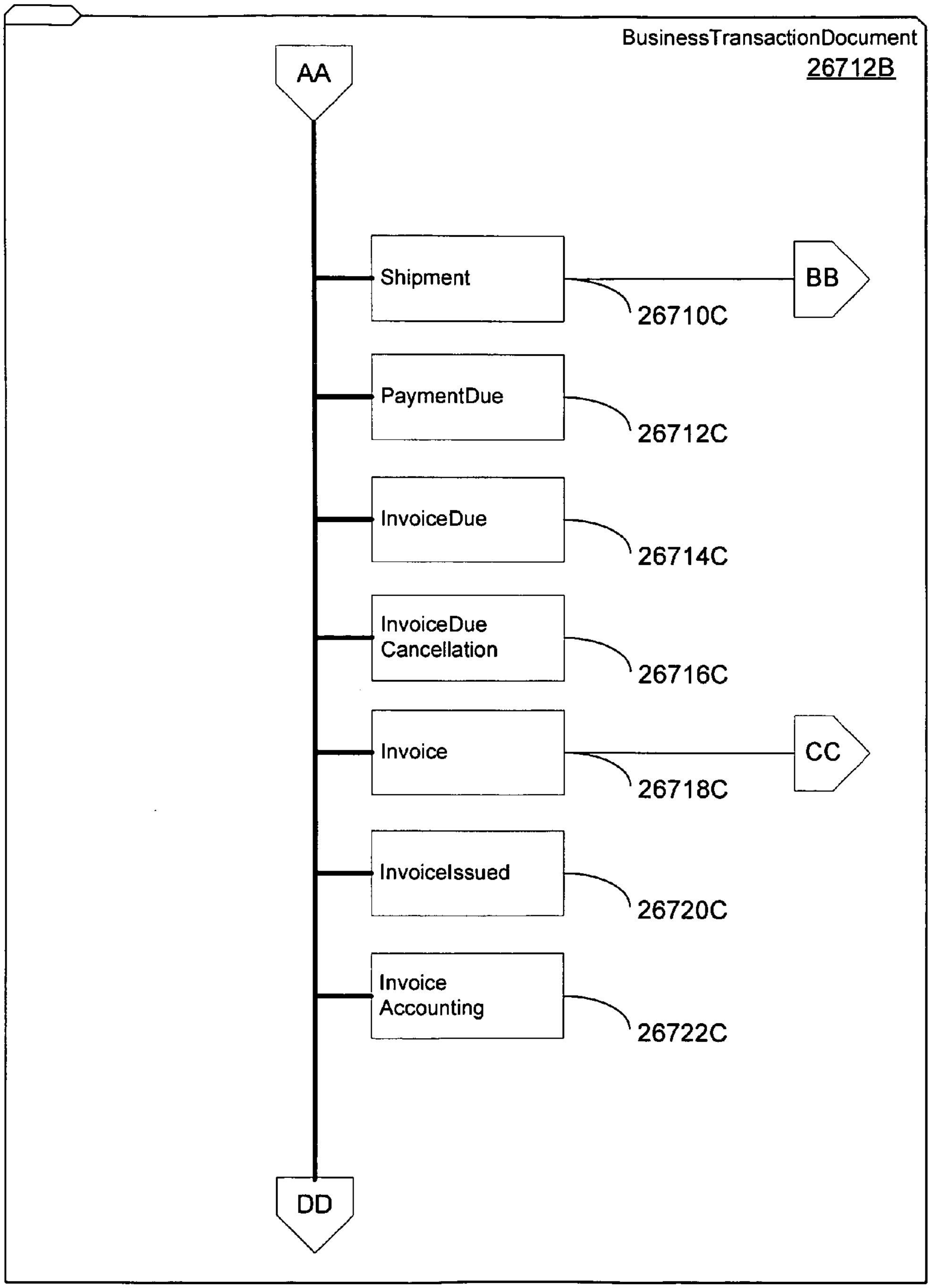
Figure 267O:
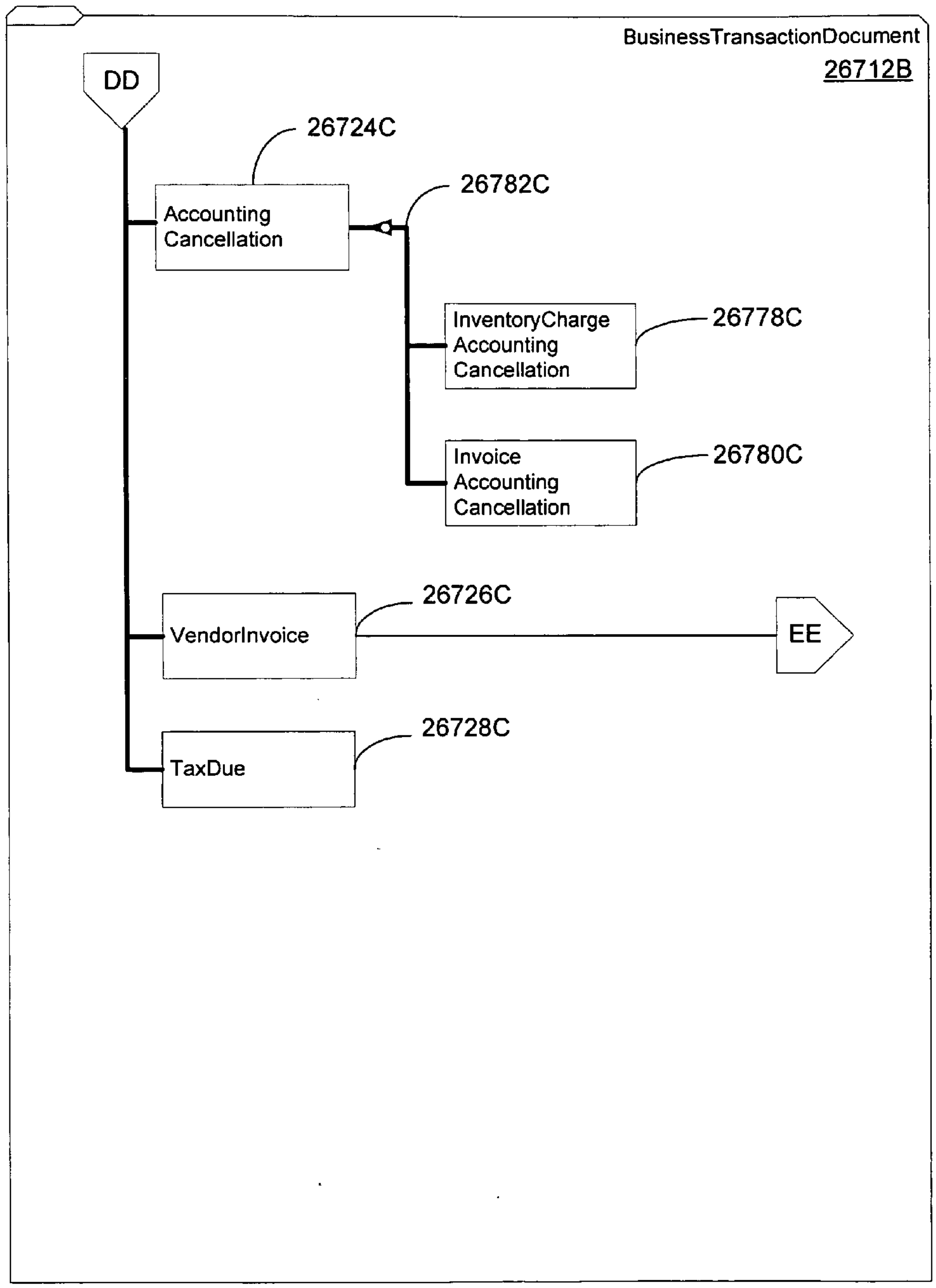
Figure 267P:
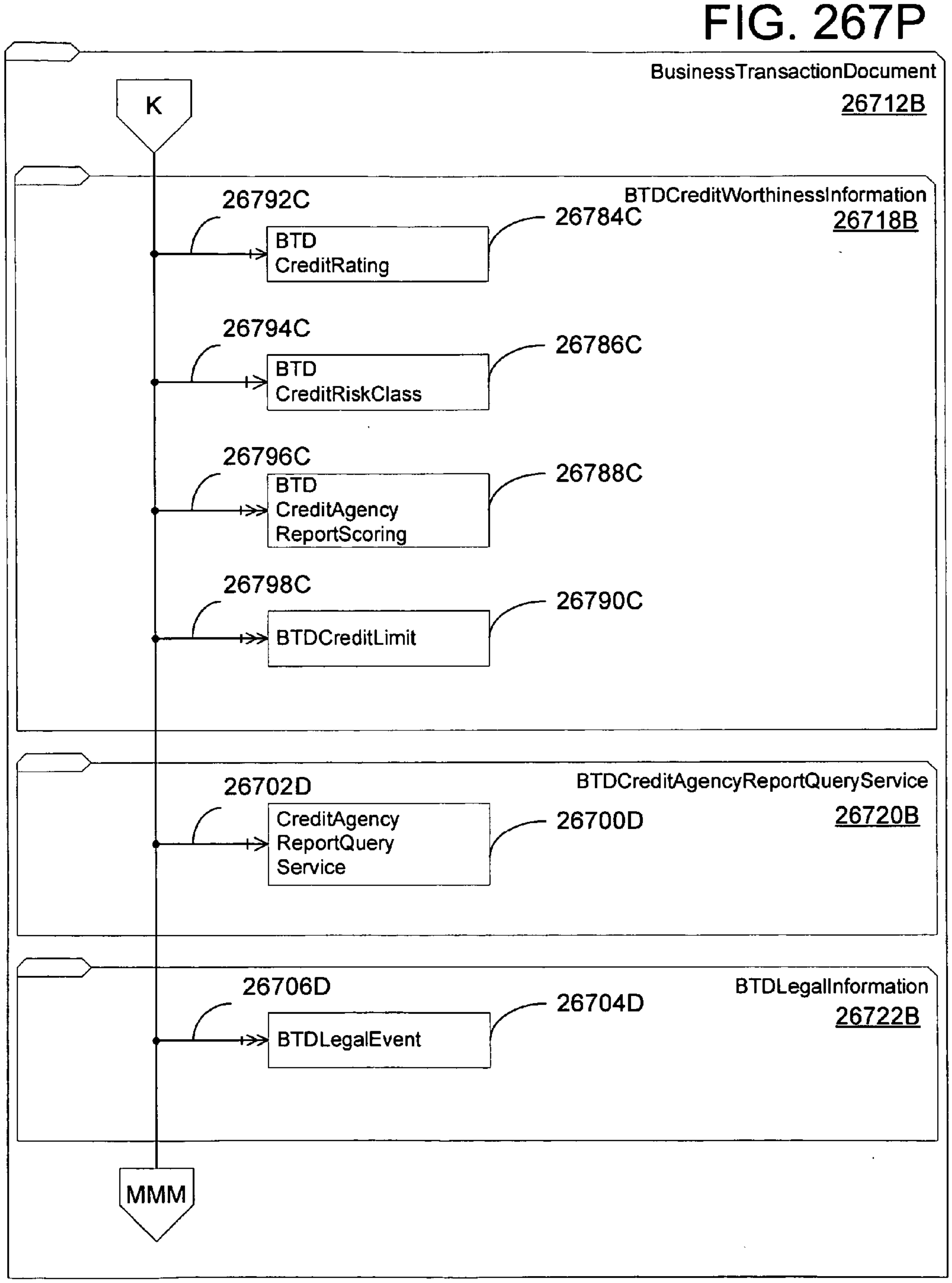
Figure 267Q:
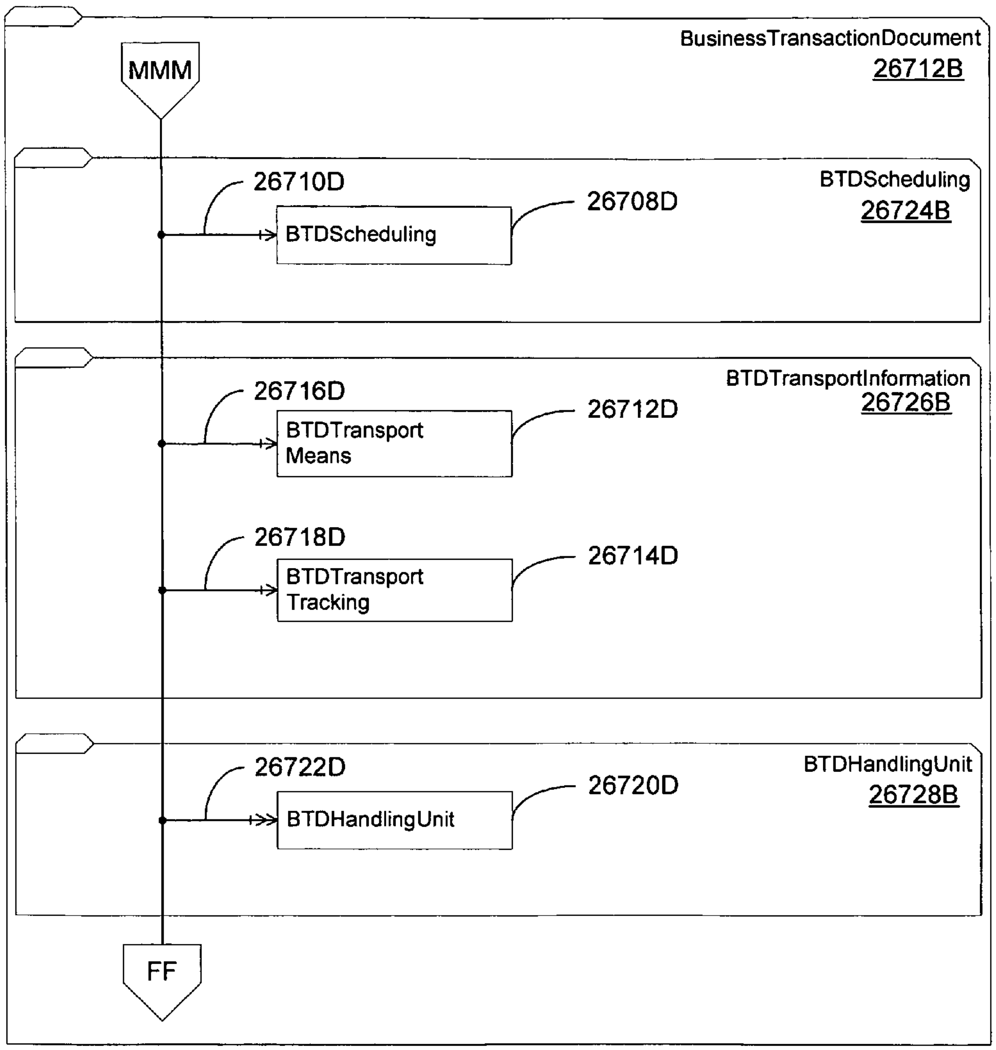
Figure 267R:
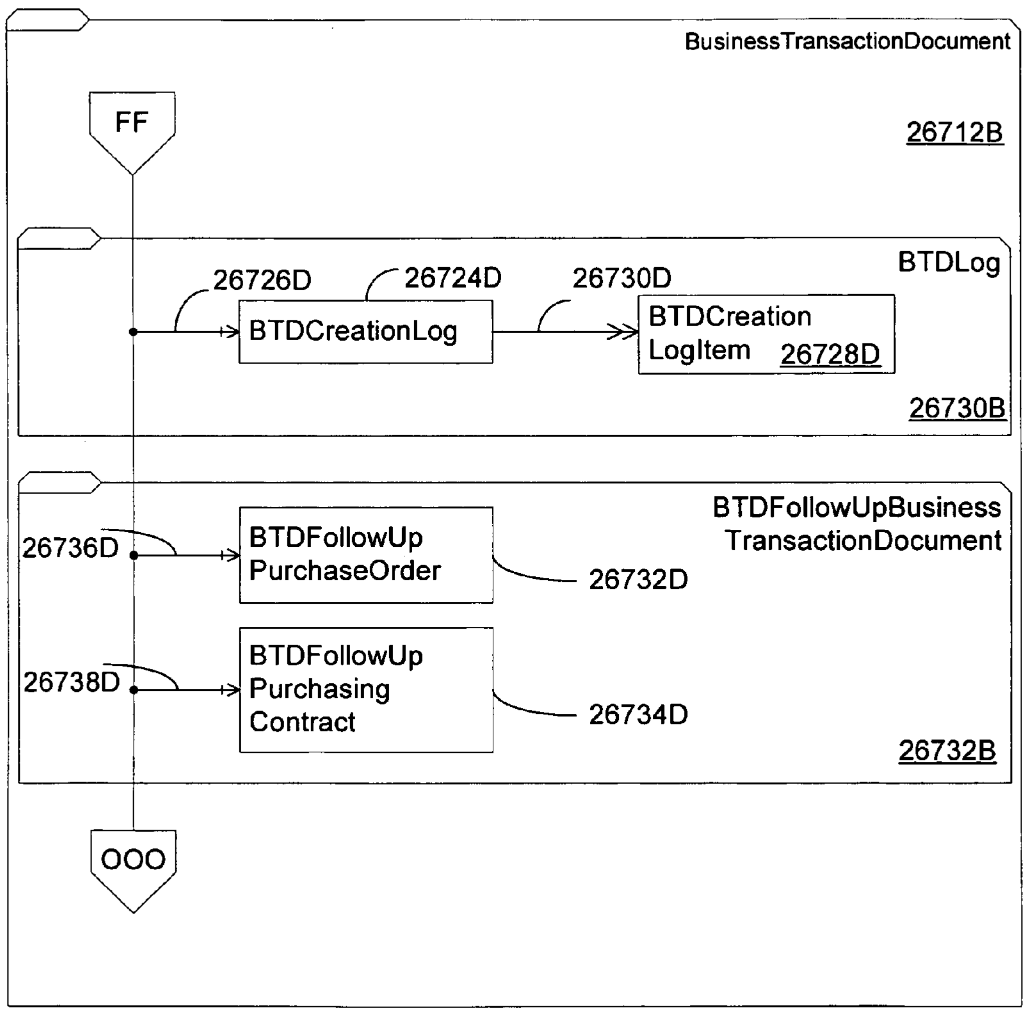
Figure 267S:
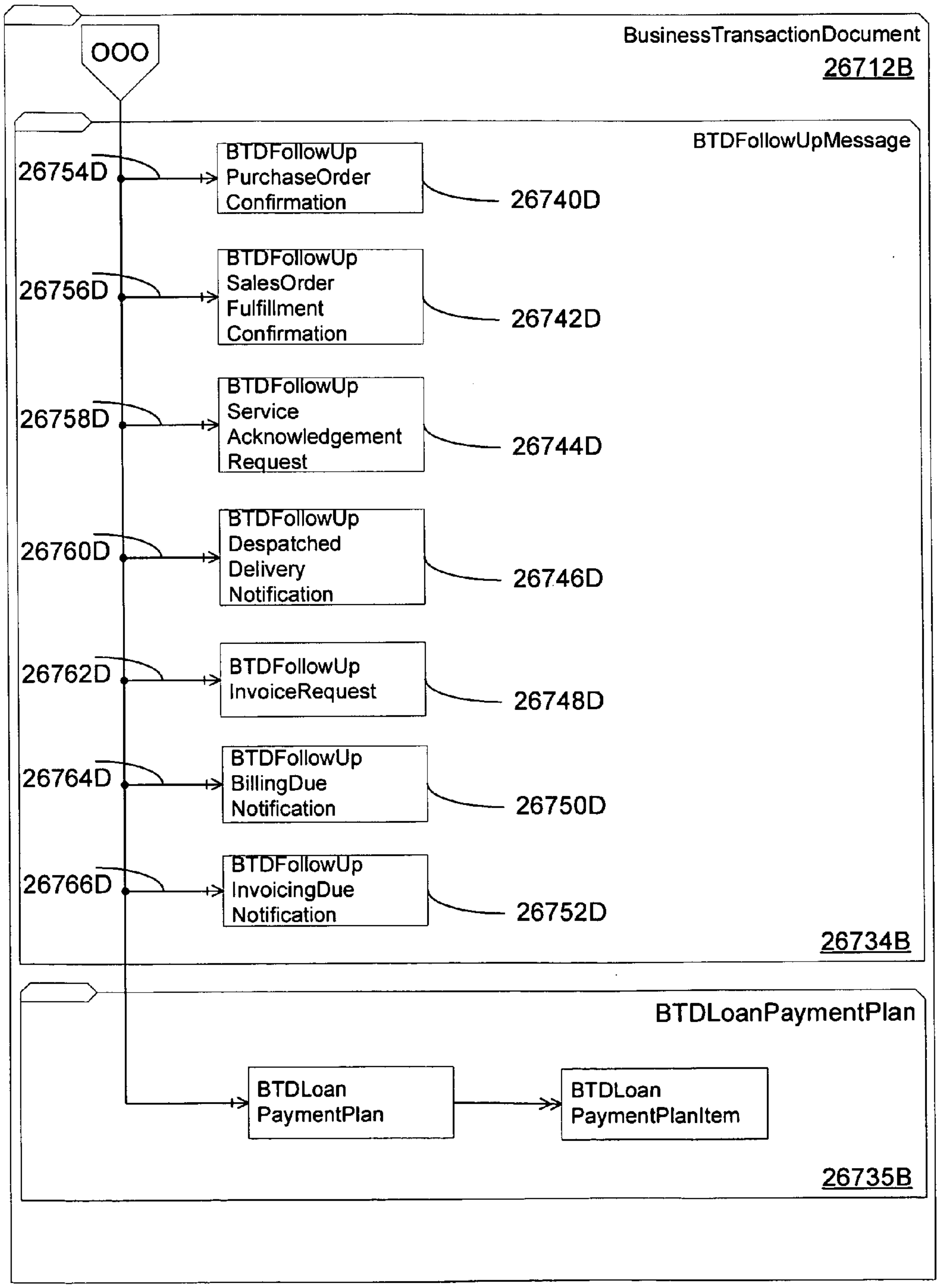
Figure 267T:
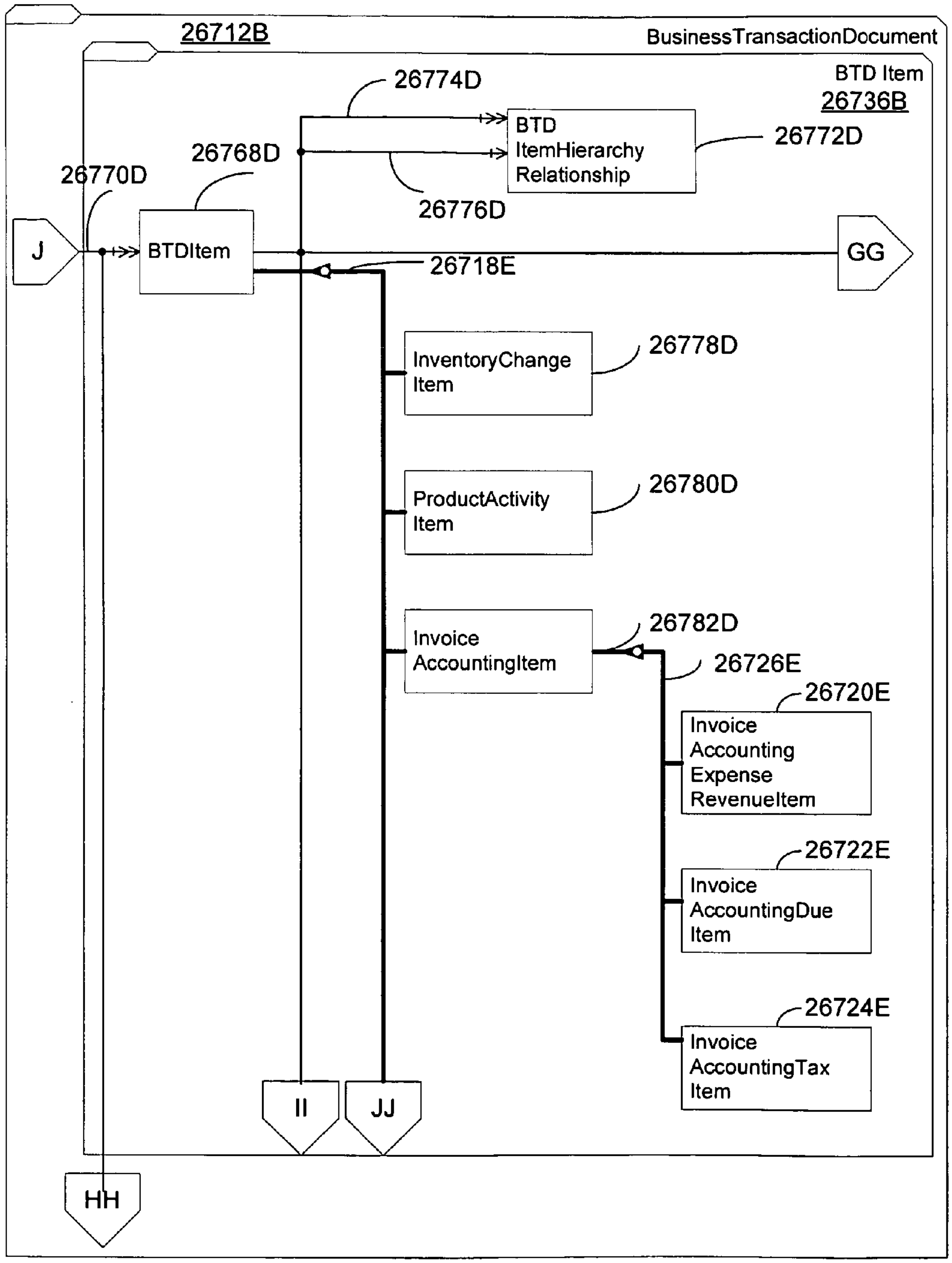
Figure 267U:
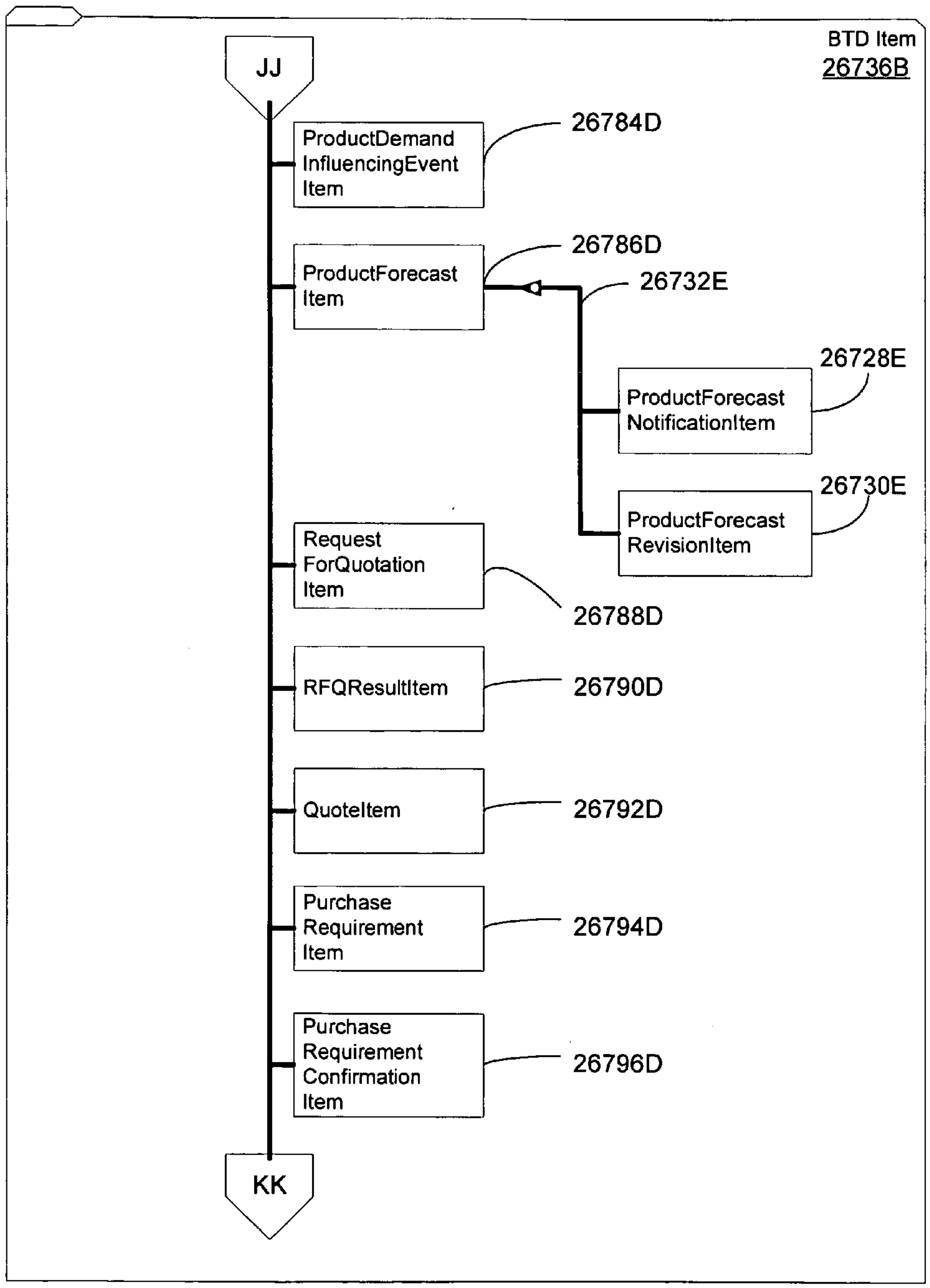
Figure 267V:
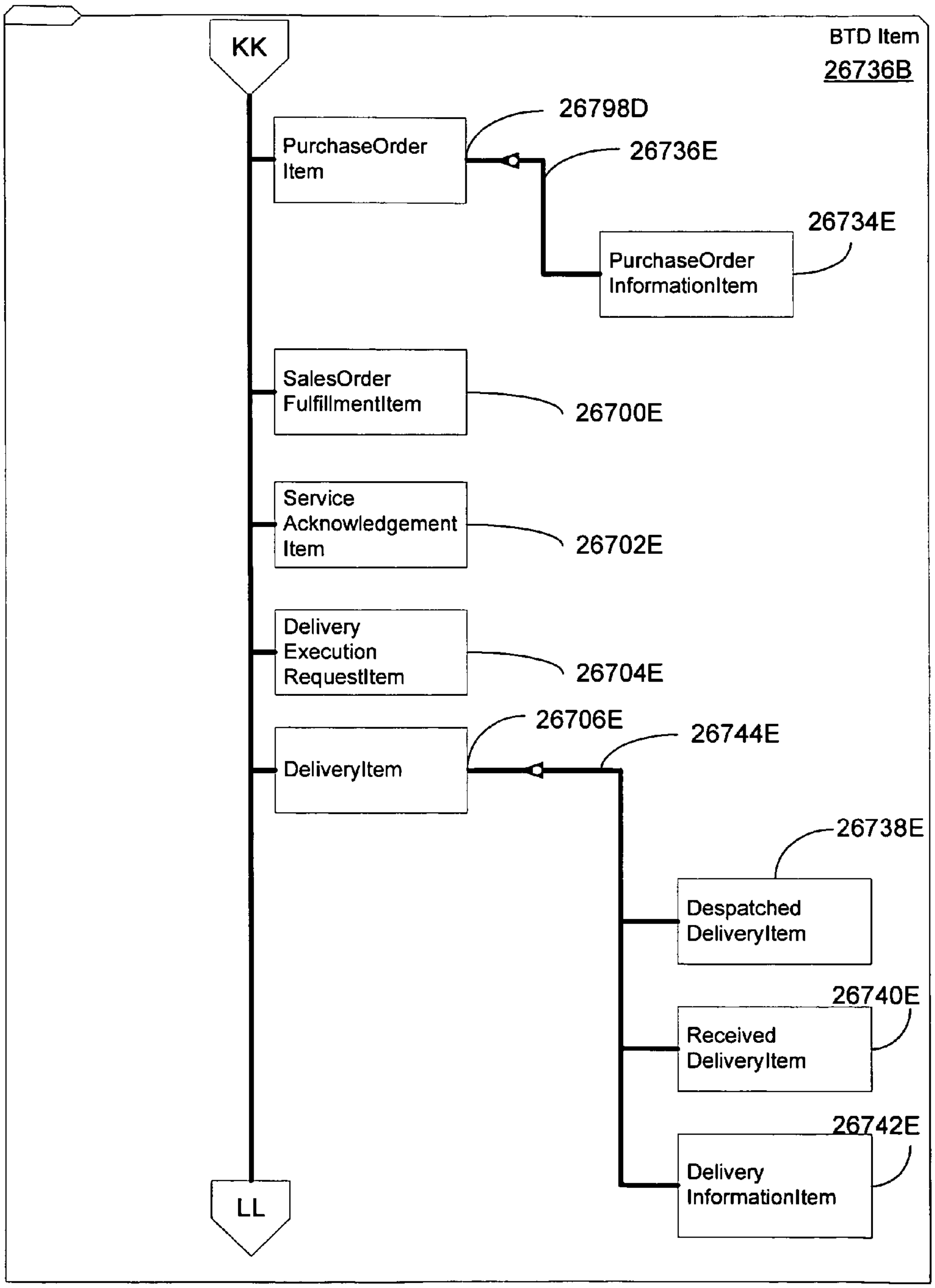
Figure 267W:
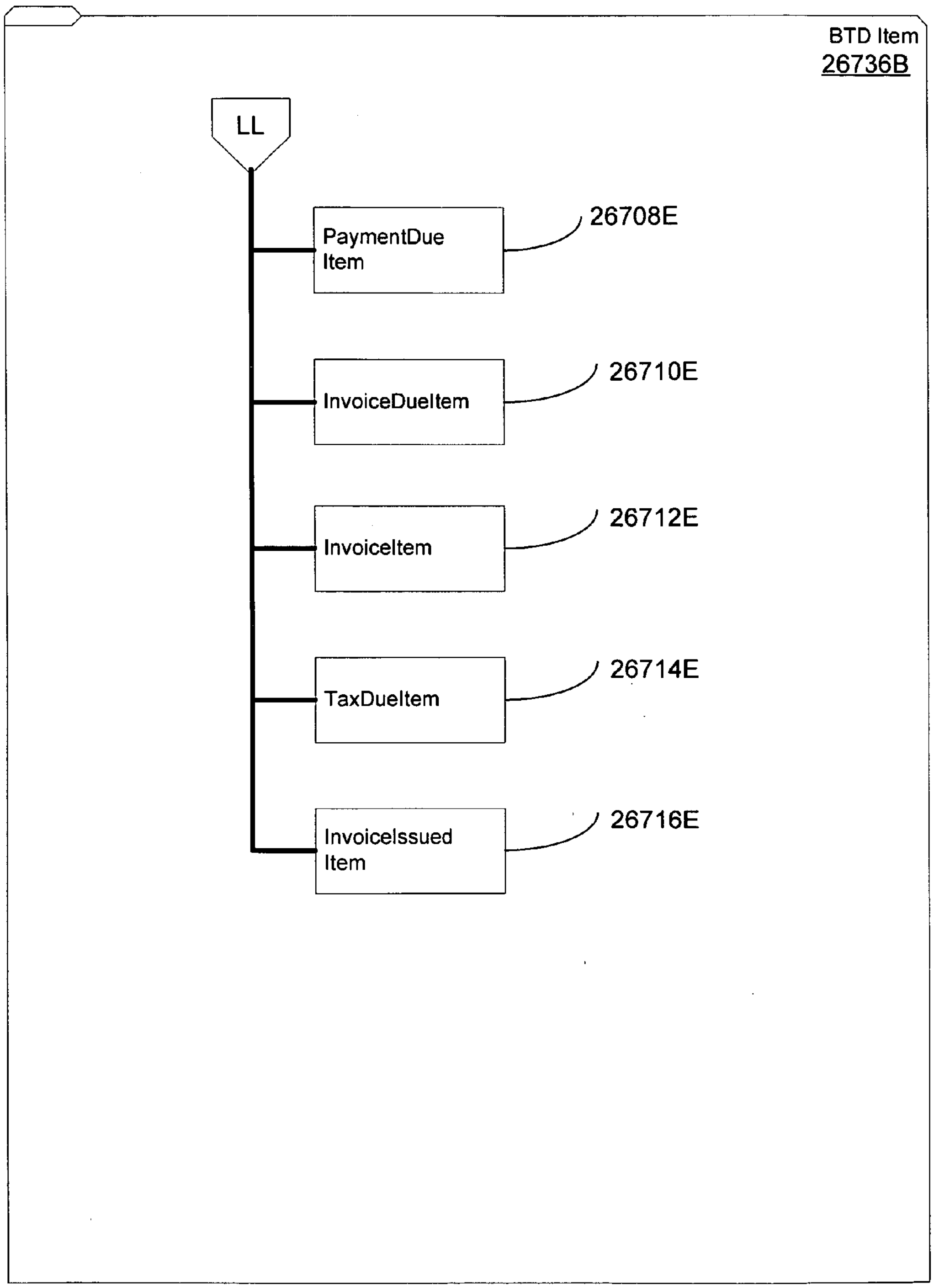
Figure 267X:
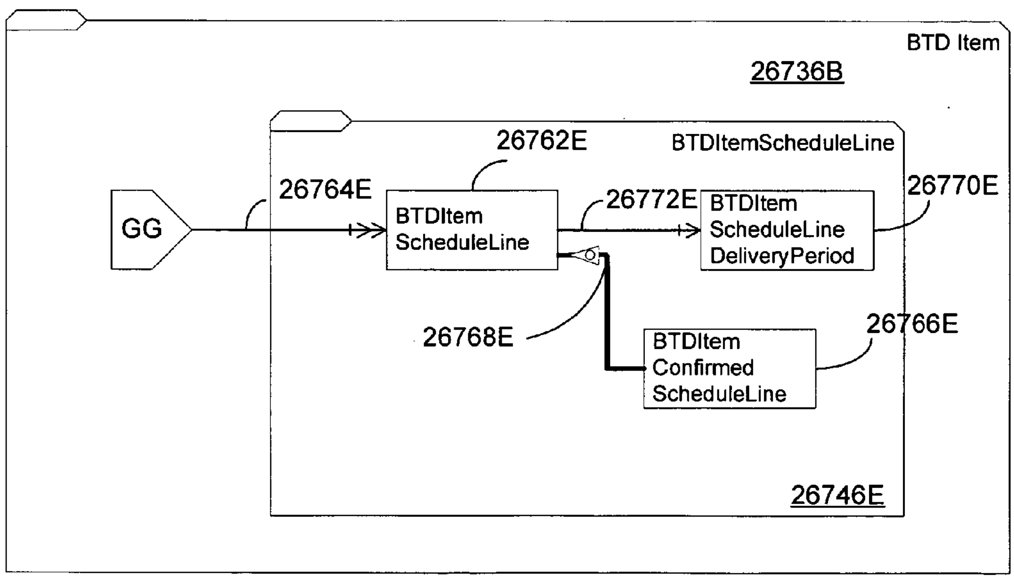
Figure 267Y:
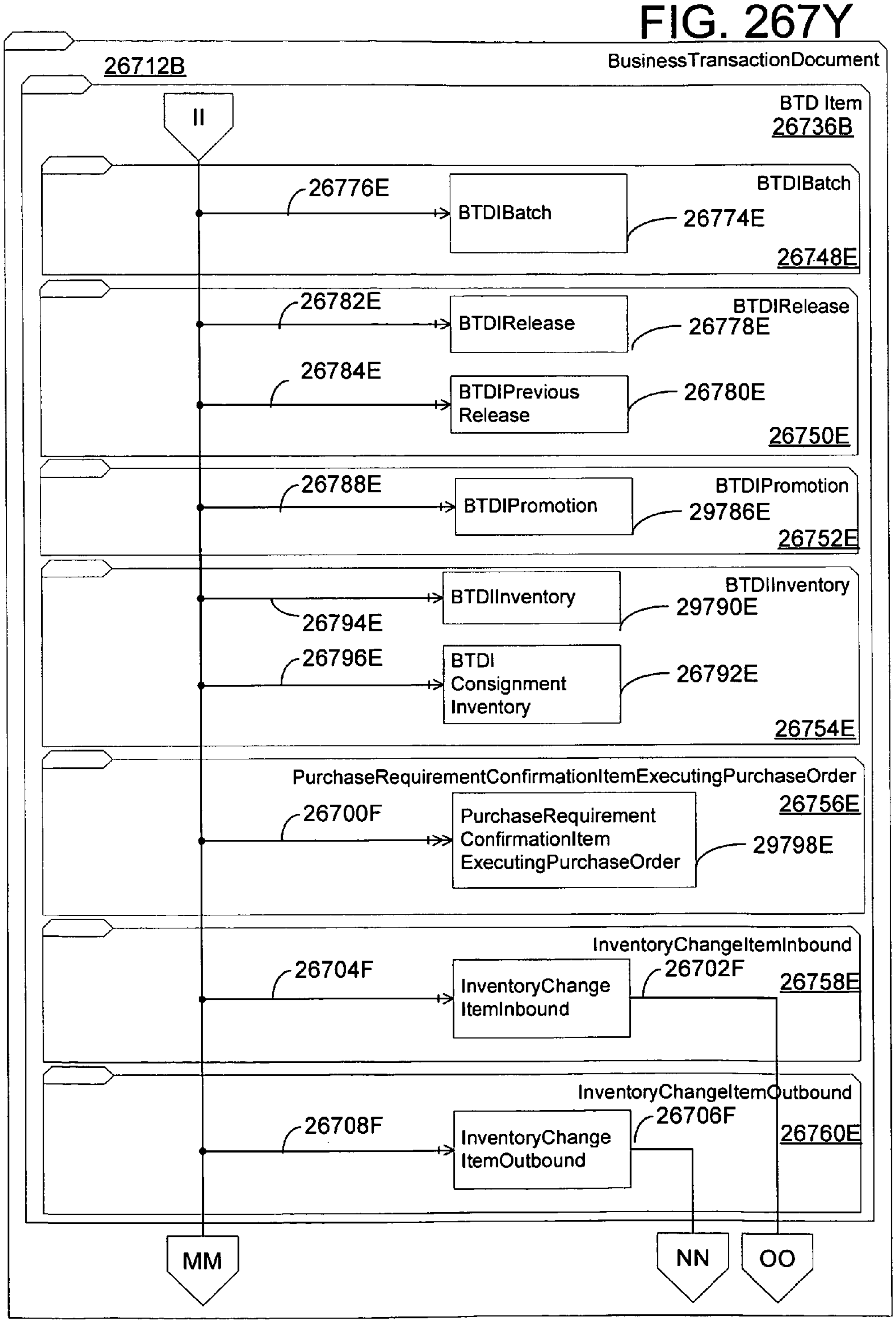
Figure 267Z:
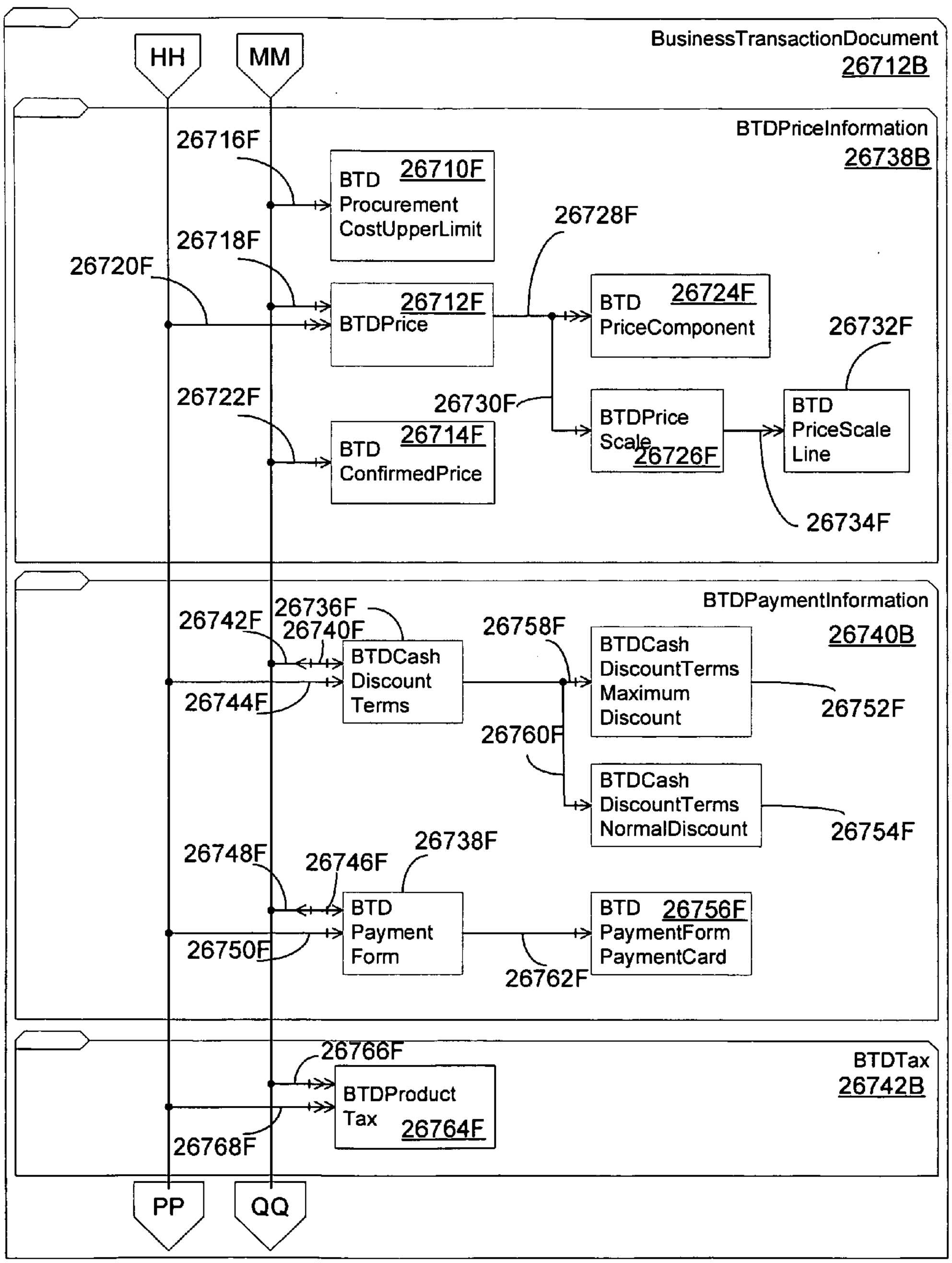
Figure 267A:
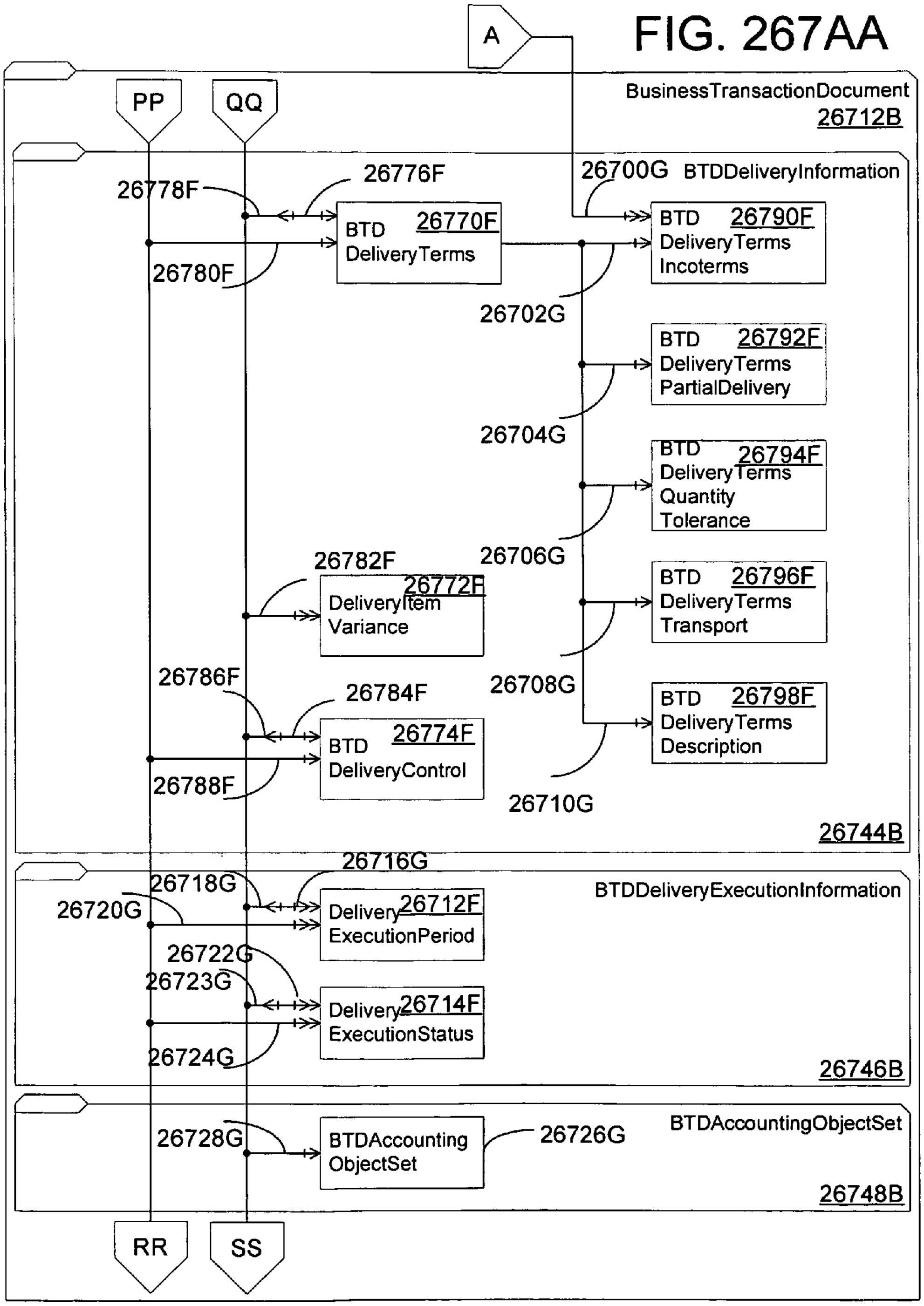
Figure 267B:
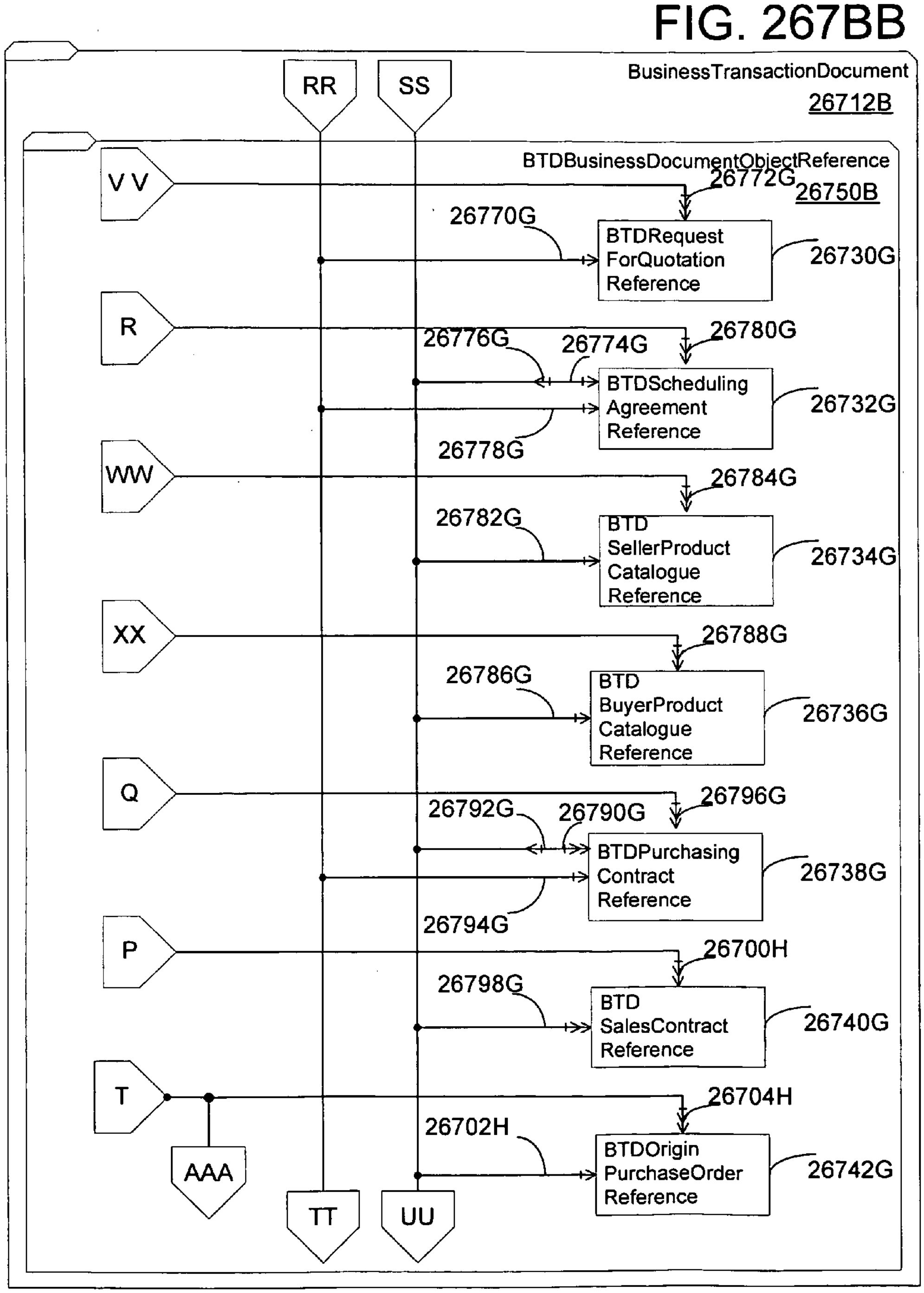
Figure 267C:
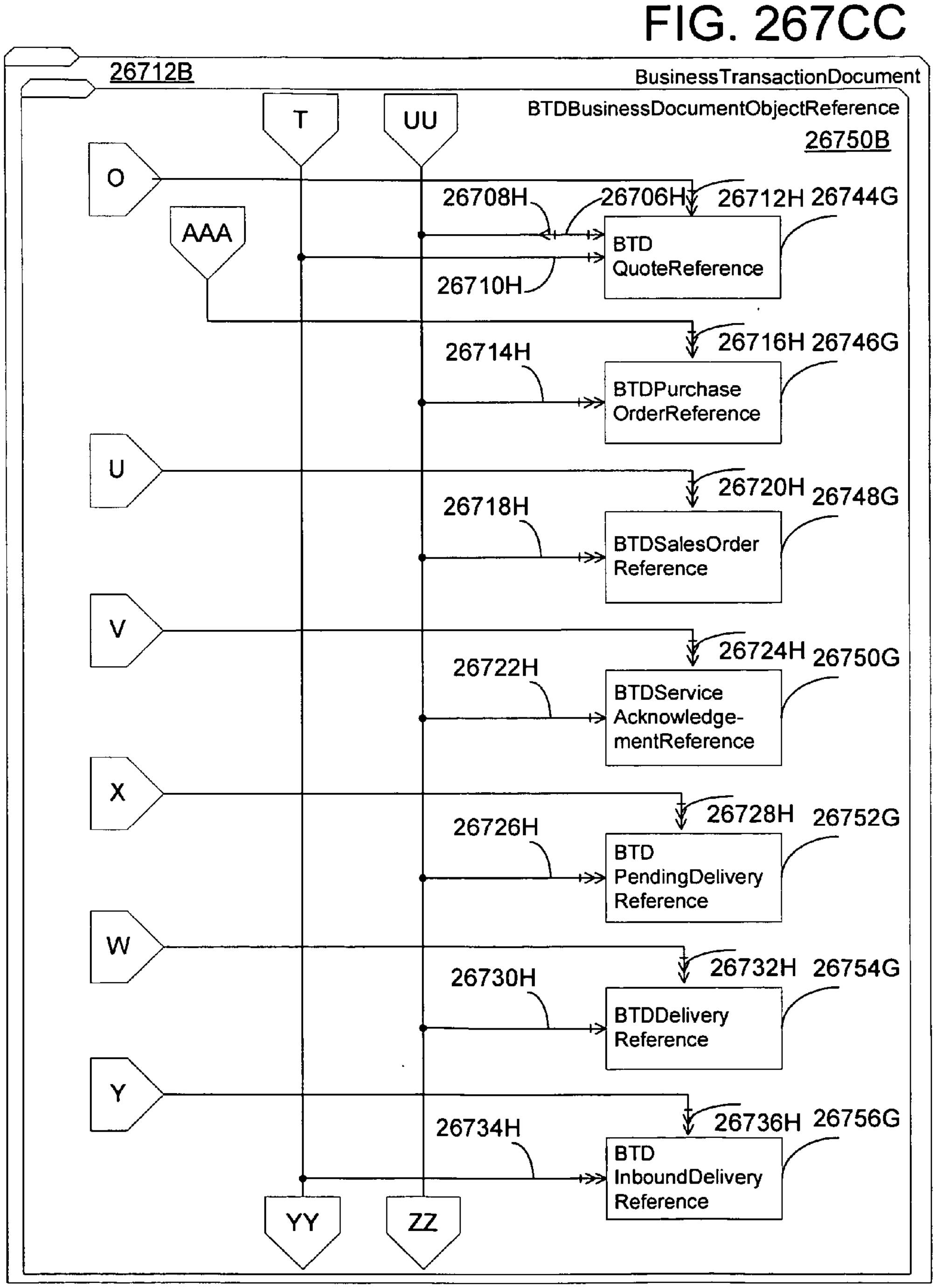
Figure 267D:
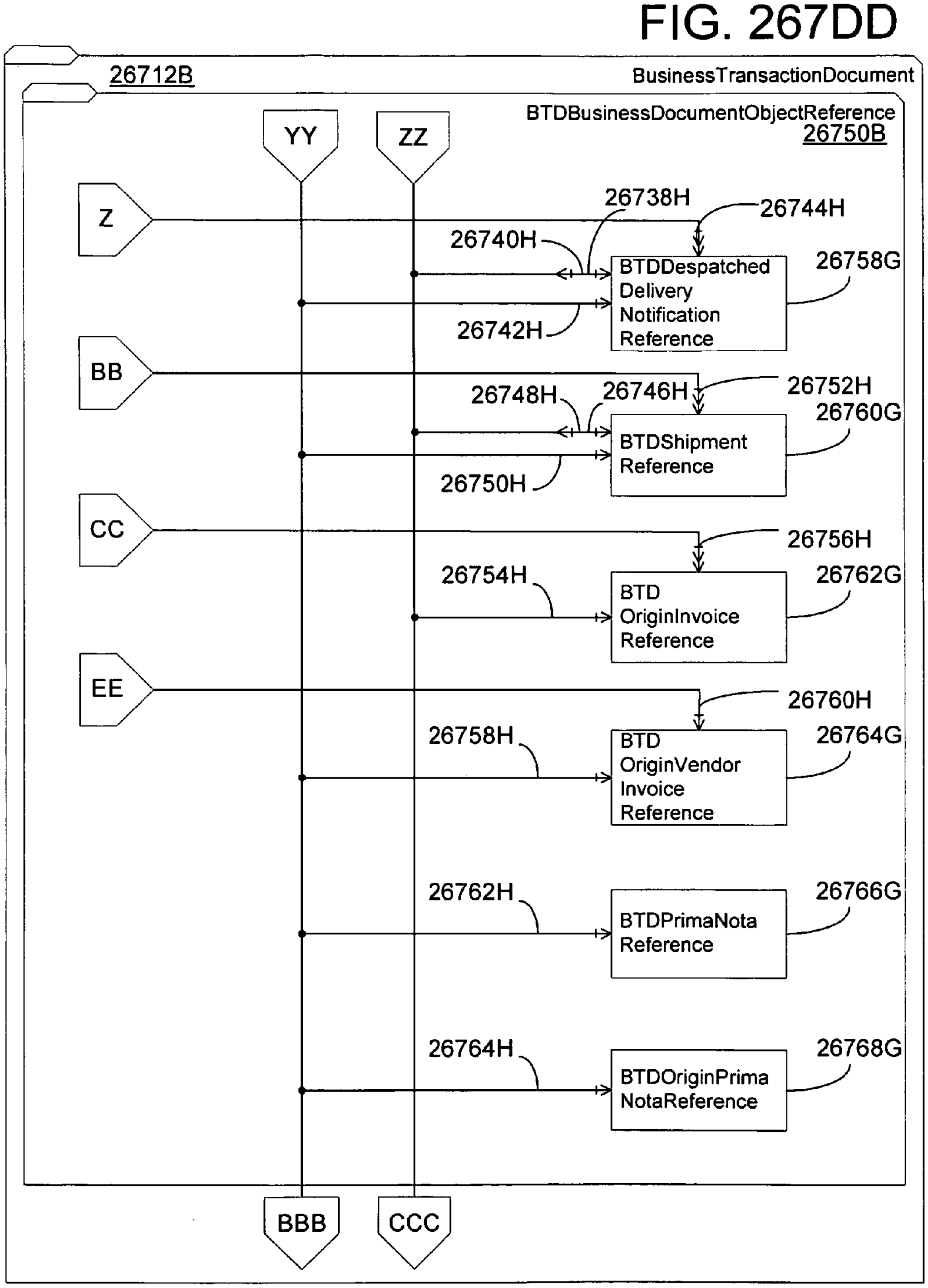
Figure 267E:
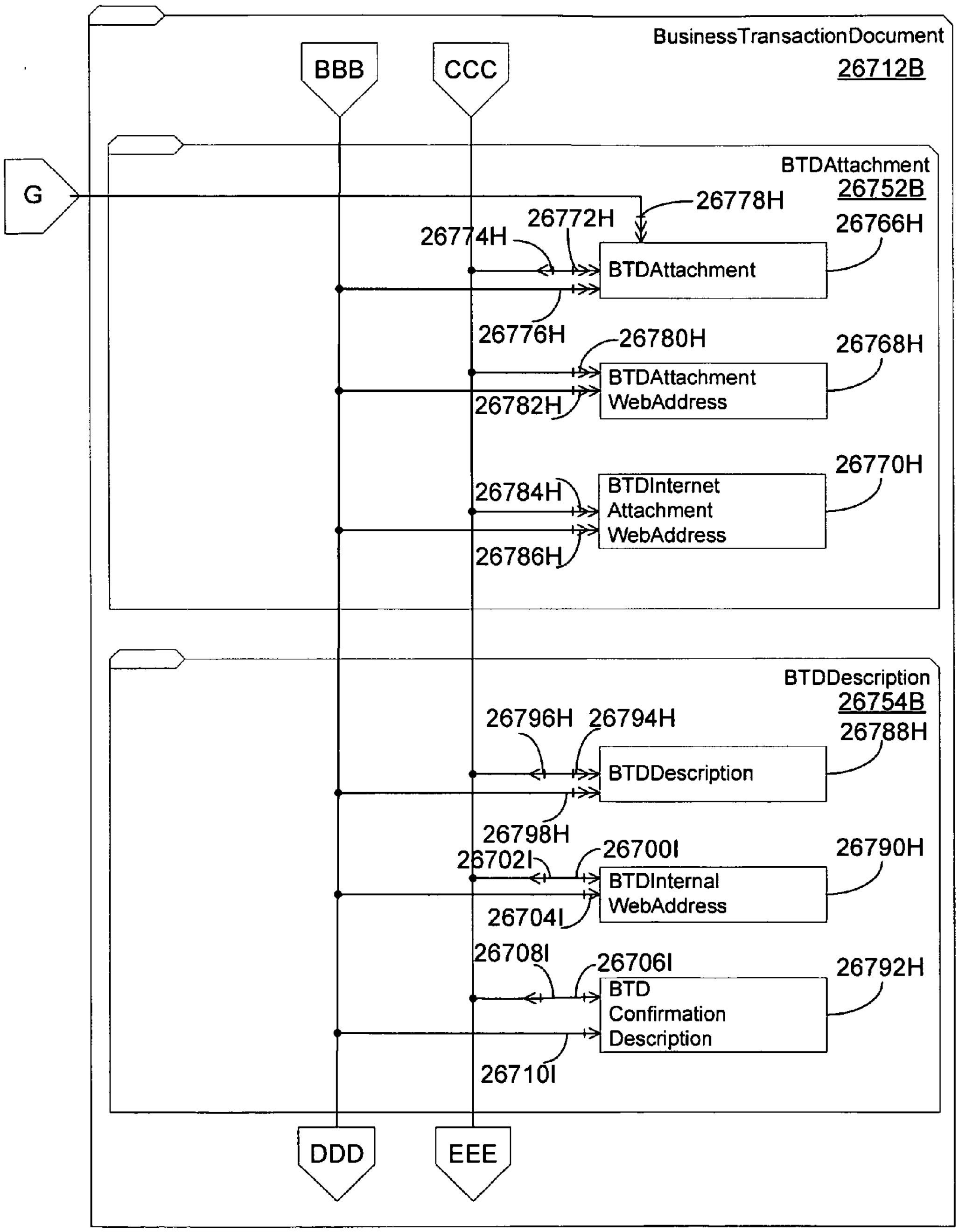
Figure 267F:
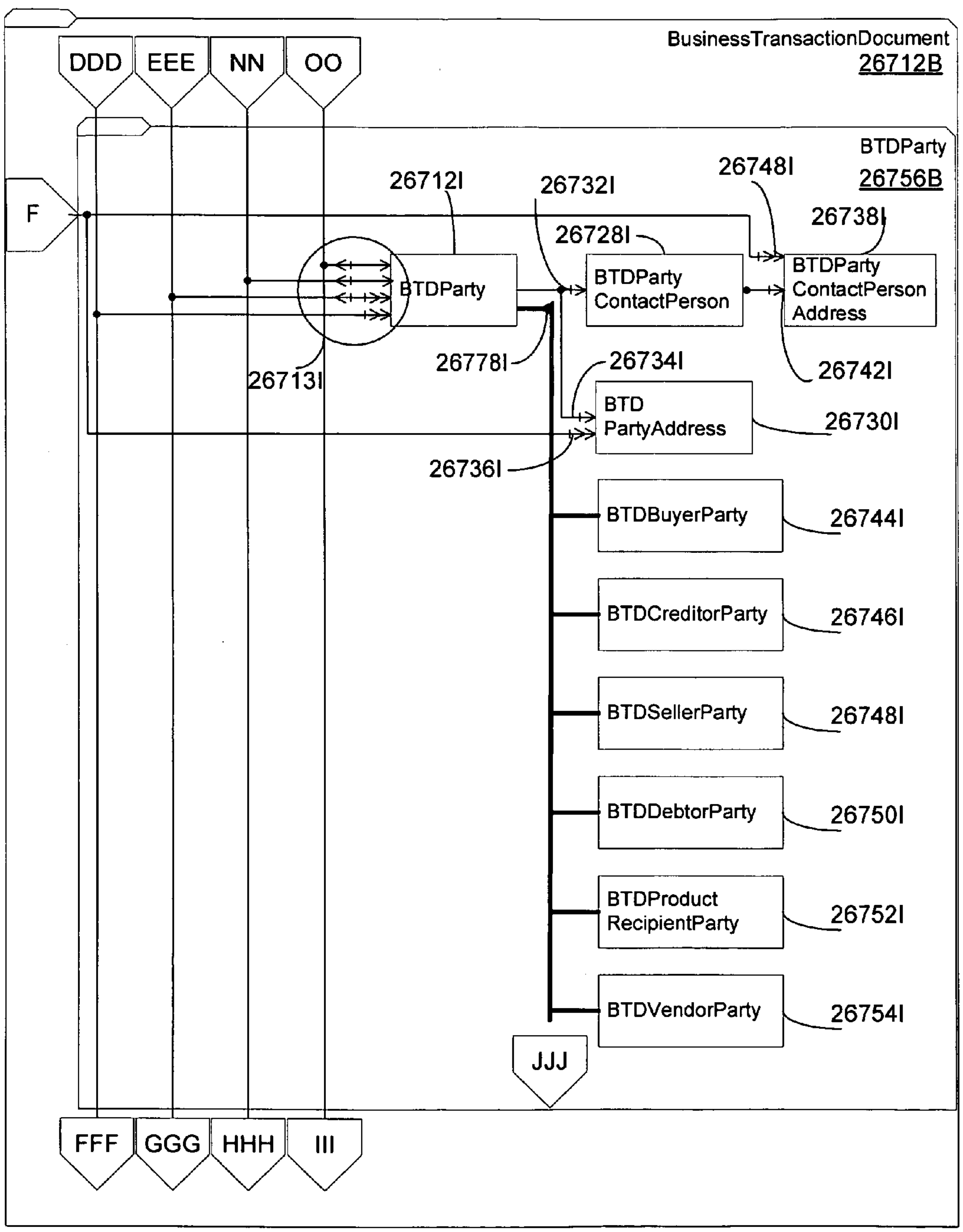
Figure 267G:
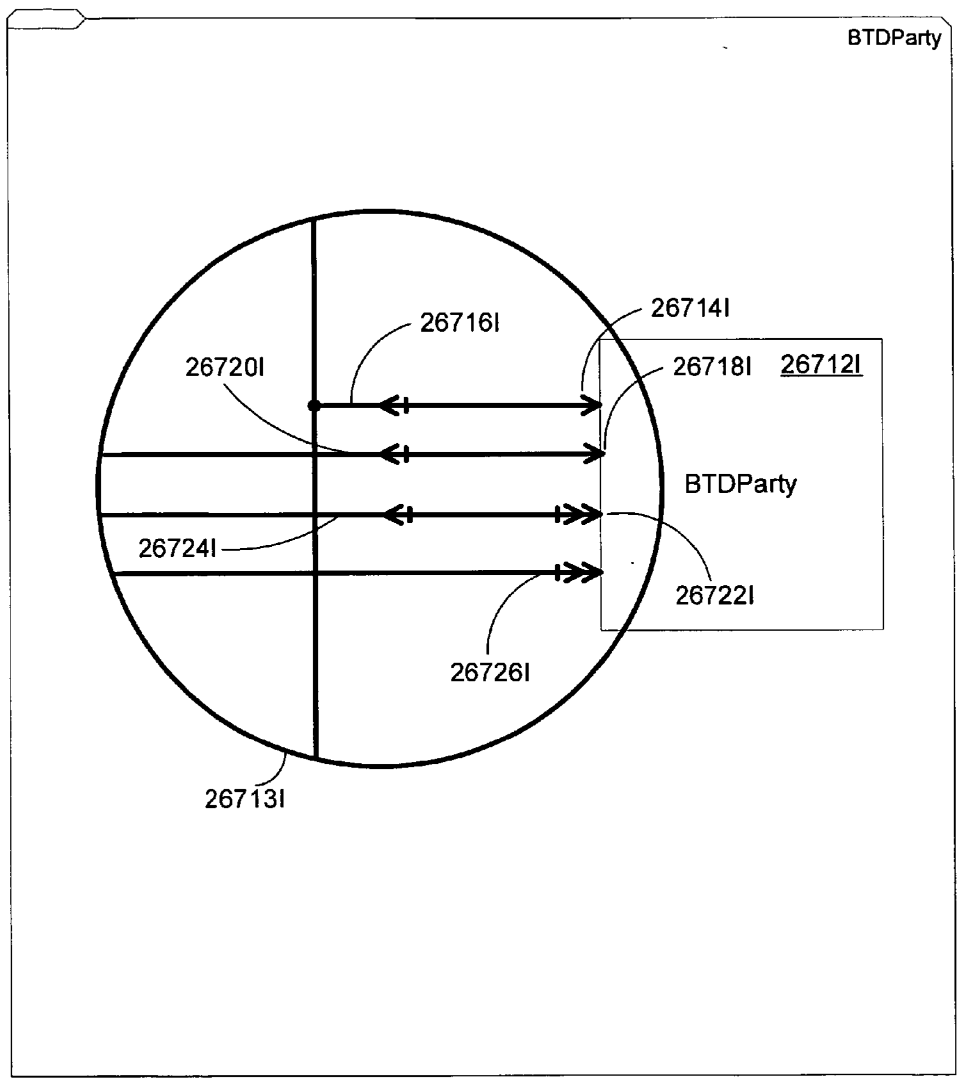
Figure 267H:
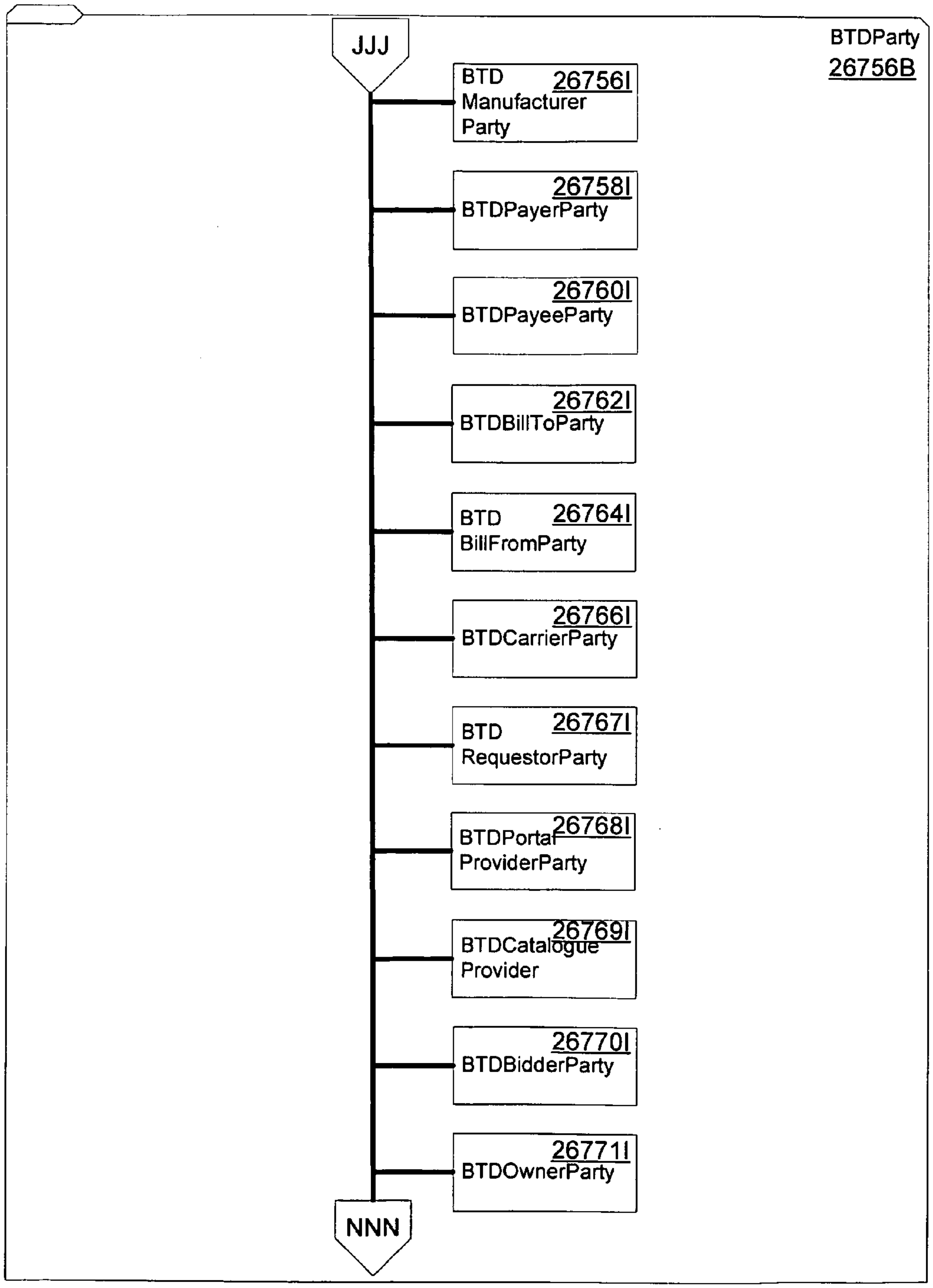
Figure 267I:
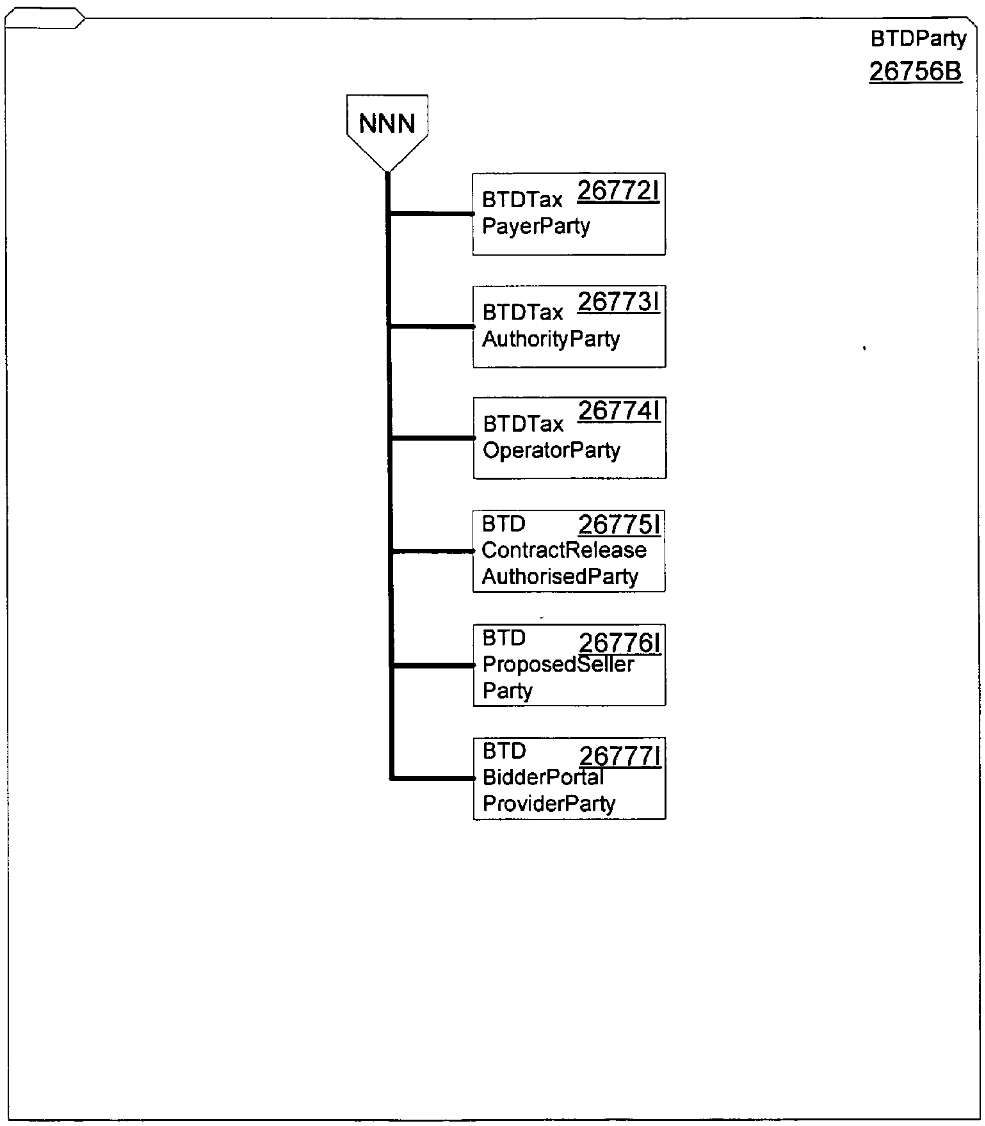
Figure 267J:
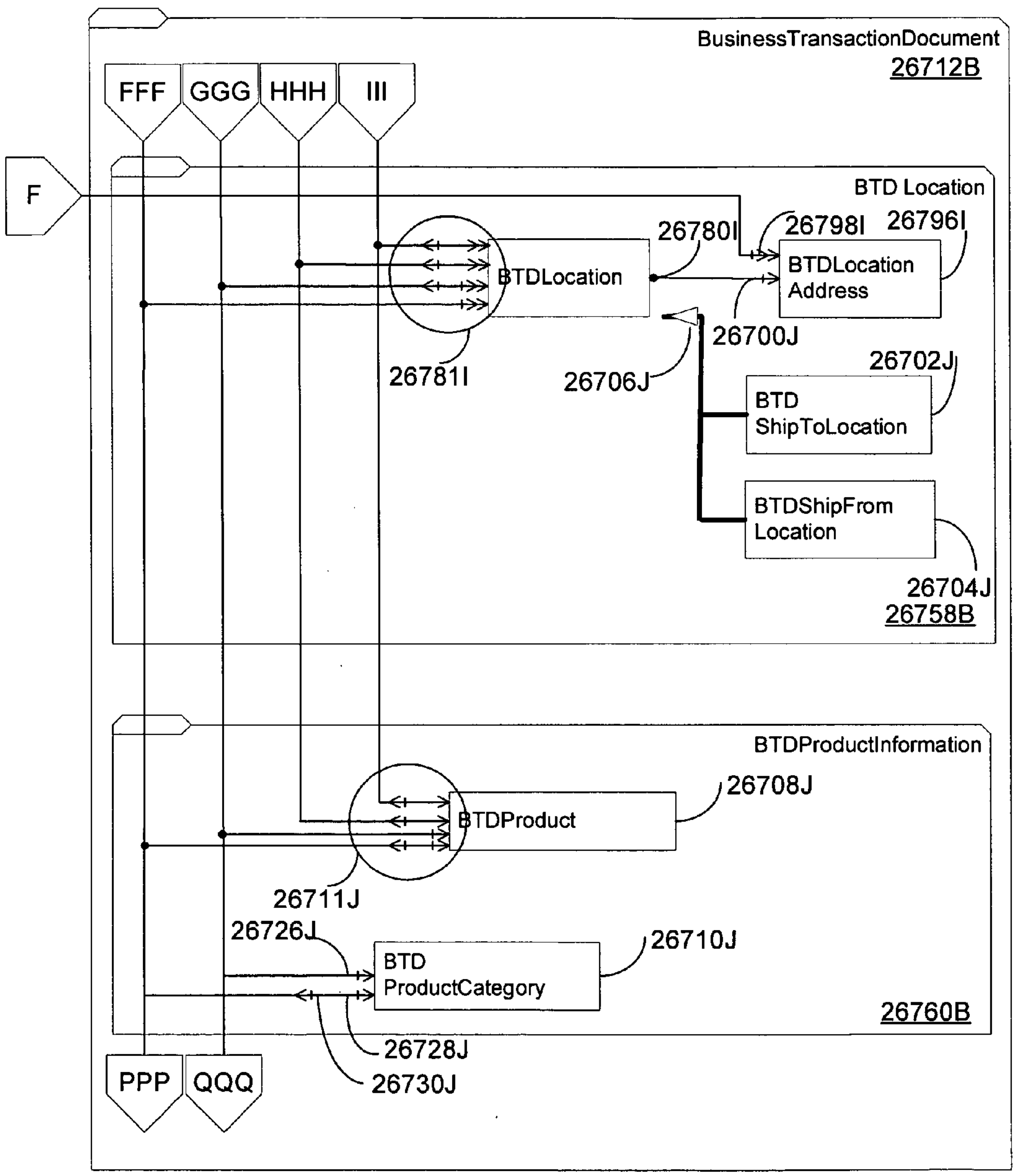
Figure 267K:
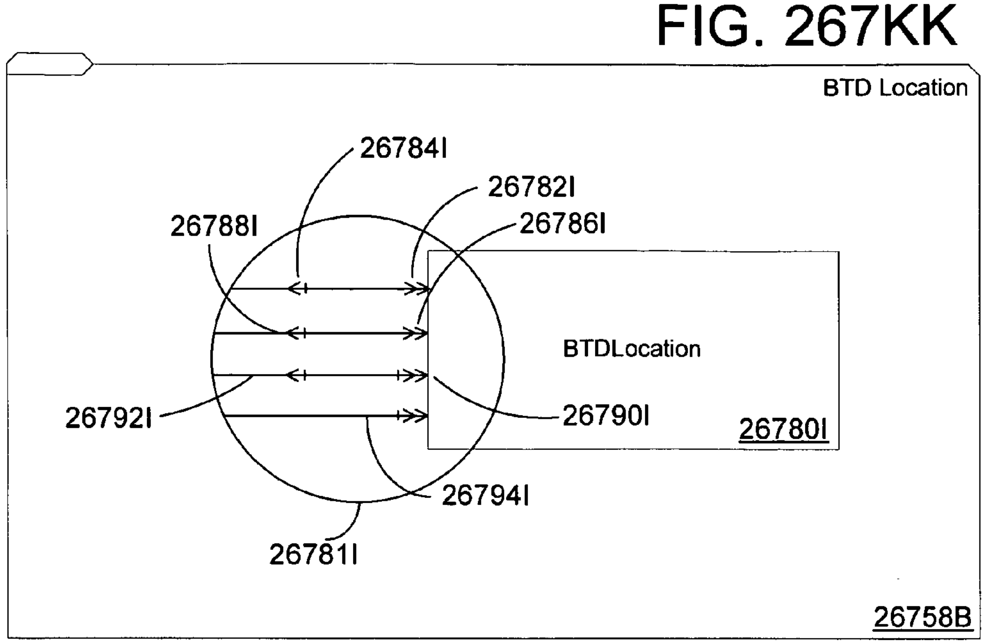
Figure 267L:
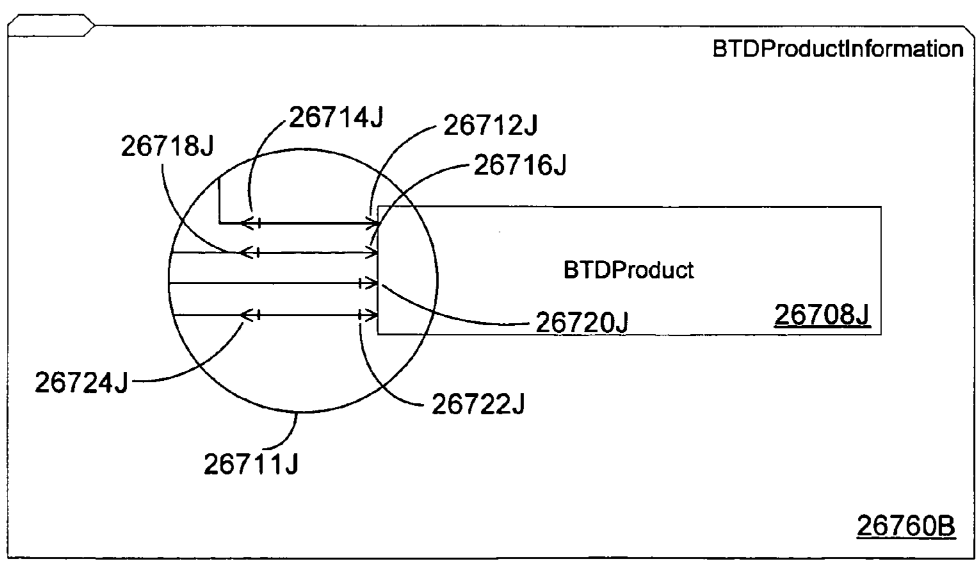
Figure 267M:
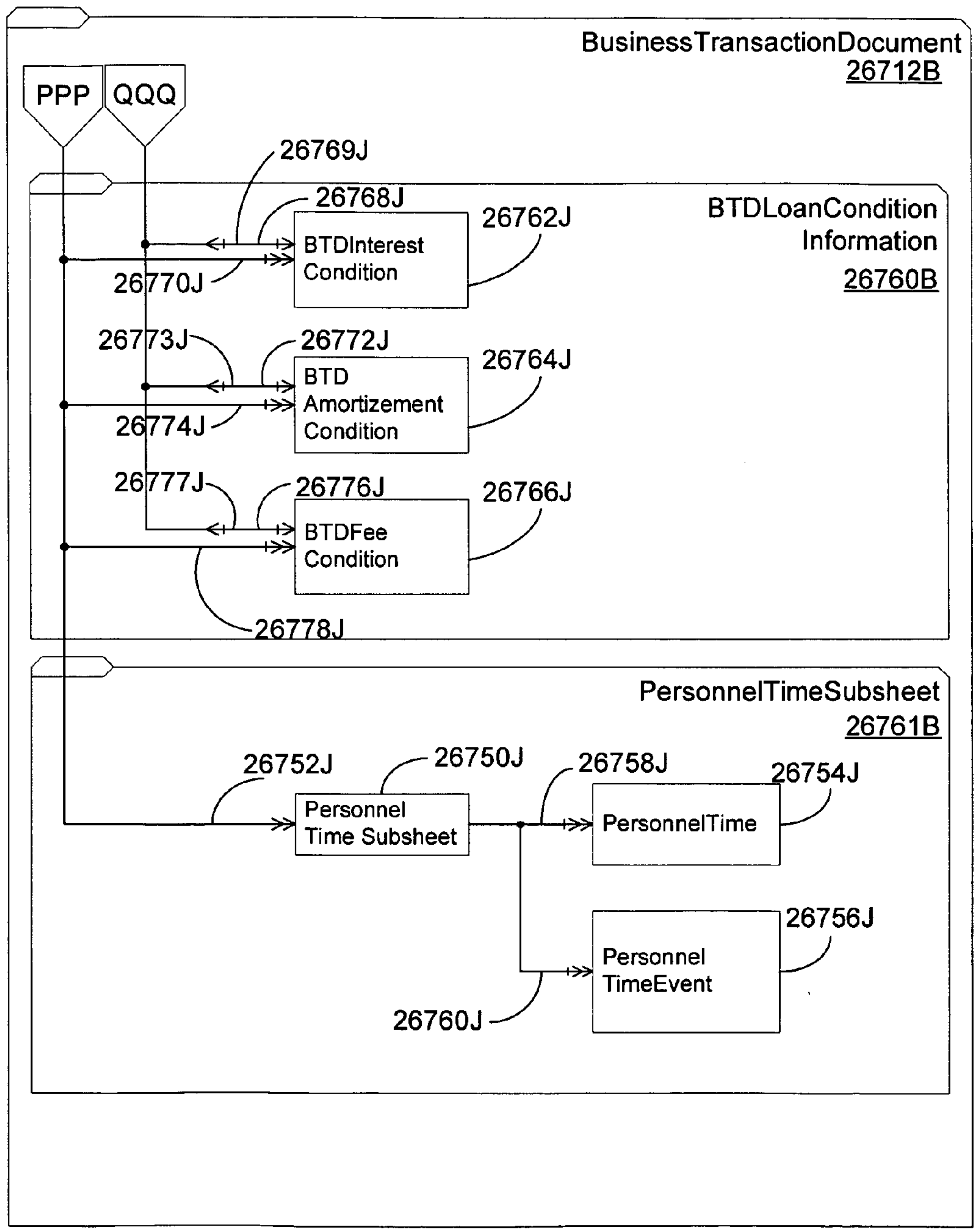
Figure 267N:
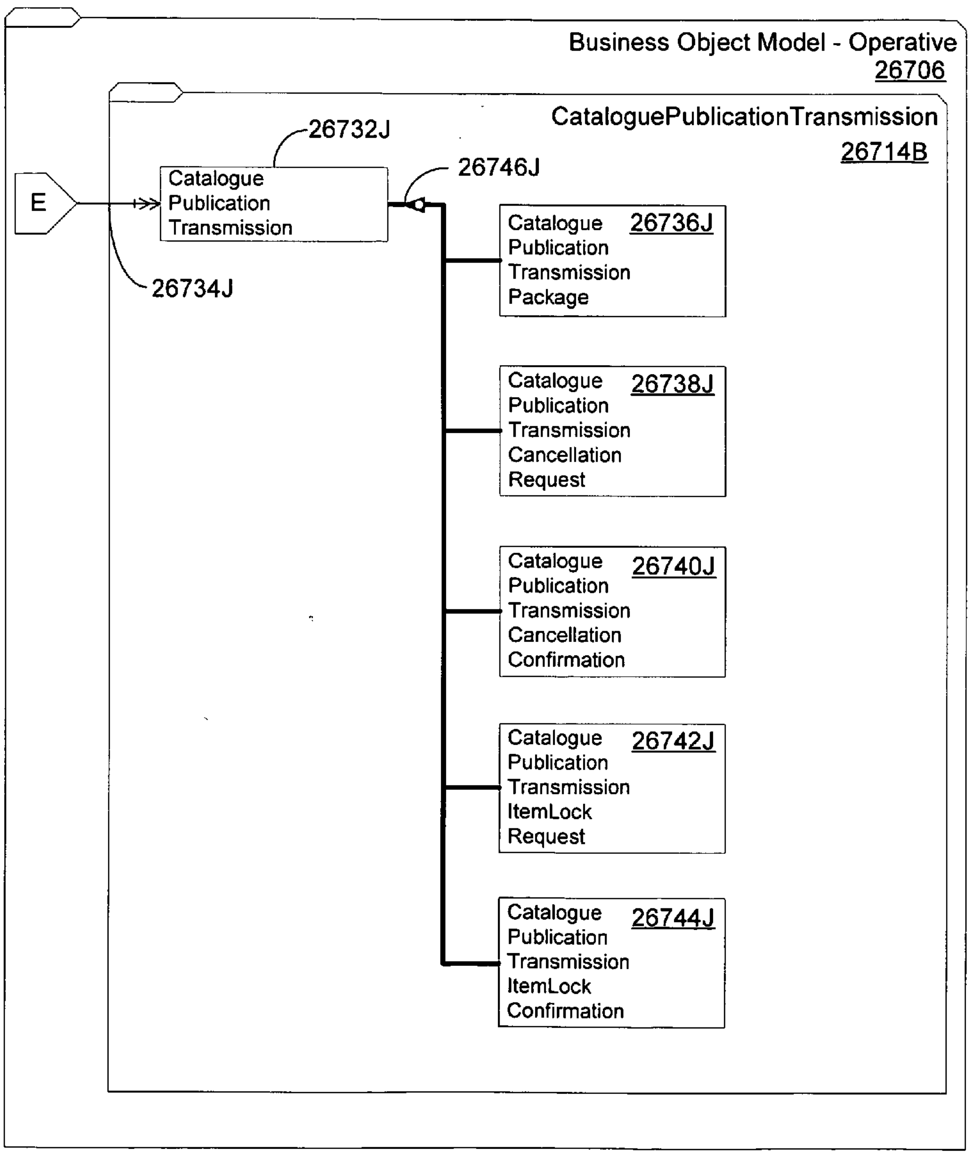

The BTDProductInformation package 26759B includes a BTDProduct entity 26708J and a BTDProductCategory entity 26710J. The details regarding the relationships 26711J to the BTDProduct entity 26708J are depicted in FIG. 267JJ. There is a 1:1 relationship 26712J between the InventoryChangeItemInbound entity 26702F and the BTDProduct entity 26708J, and a 1:c relationship 26714J between the BTDProduct entity 26708J and the InventoryChangeItemInbound entity 26702F. There is a 1:1 relationship 26716J between the InventoryChangeItemOutbound entity 26706F and the BTDProduct entity 26708J, and a 1:c relationship 26718J between the BTDProduct entity 26708J and the InventoryChangeItemOutbound entity 26706F. There is a 1:c relationship 26720J between the BTDItem entity 26768D and the BTDProduct entity 26708J. There is a 1:c relationship 26722J between the BusinessTransactionDocument entity 26762B and the BTDProduct entity 26708J, and a 1:c relationship 26724J between the BTDProduct entity 26708J and the BusinessTransactionDocument entity 26762B. There is a 1:c relationship 26726J between the BTDItem entity 26768D and the BTDProductCategory entity 26710J. There is a 1:c relationship 26728J between the BusinessTransactionDocument entity 26762B and the BTDProductCategory entity 26710J, and a 1:c relationship 26730J between the BTDProductCategory entity 26710J and the BusinessTransactionDocument entity 26762B.

The BTDLoanConditionInformation package includes a BTDInterestCondition entity 26762J, a BTDAmortizementCondition entity 26764J, and a BTDFeeCondition entity 26766J. There is a 1:c relationship 26768J between the BTDItem entity 26768D and the BTDInterestCondition entity 26762J, and a 1:c relationship 26769J between the BTDInterestCondition entity 26762I and the BTDItem entity 26768D. There is a 1:cn relationship 26770J between the BusinessTransactionDocument entity 26762B and the BTDInterestCondition entity 26762J. There is a 1:c relationship 26772J between the BTDItem entity 26768D and the BTDAmortizementCondition entity 26764J, and a 1:c relationship 26773J between the BTDAmortizementCondition entity 26764J and the BTDItem entity 26768D. There is a 1:cn relationship 26774J between the BusinessTransactionDocument entity 26762B and the BTDAmortizementCondition entity 26764J. There is a 1:c relationship 26776J between the BTDItem entity 26768D and the BTDFeeCondition entity 26766J, and a 1:c relationship 26777J between the BTDFeeCondition entity 26766J and the BTDItem entity 26768D. There is a 1:cn relationship 26778J between the BusinessTransactionDocument entity 26762B and the BTDFeeCondition entity 26766J.

The PersonnelTimeSubSheet package 26761B includes a PersonnelTimeSubSheet entity 26750J. There is a 1:n relationship 26752J between the BusinessTransactionDocument entity 26762B and the PersonnelTimeSubSheet entity 26750J. The PersonnelTimeSubSheet entity 26750J includes a PersonnelTime entity 26754J and a PersonnelTimeEvent entity 26756J. There is a 1:cn relationship 26758J between the PersonnelTimeSubSheet entity 26750J and the PersonnelTime entity 26754J. There is a 1:cn relationship 26760J between the PersonnelTimeSubSheet entity 26750J and the PersonnelTimeEvent entity 26756J.

The CataloguePublicationTransmission package 26714B includes a CataloguePublicationTransmission entity 26732J. There is a 1:cn relationship 26734J between the Catalogue entity 26766 and the CataloguePublicationTransmission entity 26732J. The CataloguePublicationTransmission entity 26732J is specialized into a CataloguePublicationTransmissionPackage entity 26736J, a CataloguePublicationTransmissionCancellationRequest entity 26738J, a CataloguePublicationTransmissionCancellationConfirmation entity 26740J, a CataloguePublicationTransmissionItemLockRequest entity 26742J and a CataloguePublicationTransmissionItemLockConfirmation entity 26744J, which are disjoint complete specializations 26746J of the CataloguePublicationTransmission entity 26732J.

5. Interfaces Derived from Business Object Model

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface.

Figure 313:
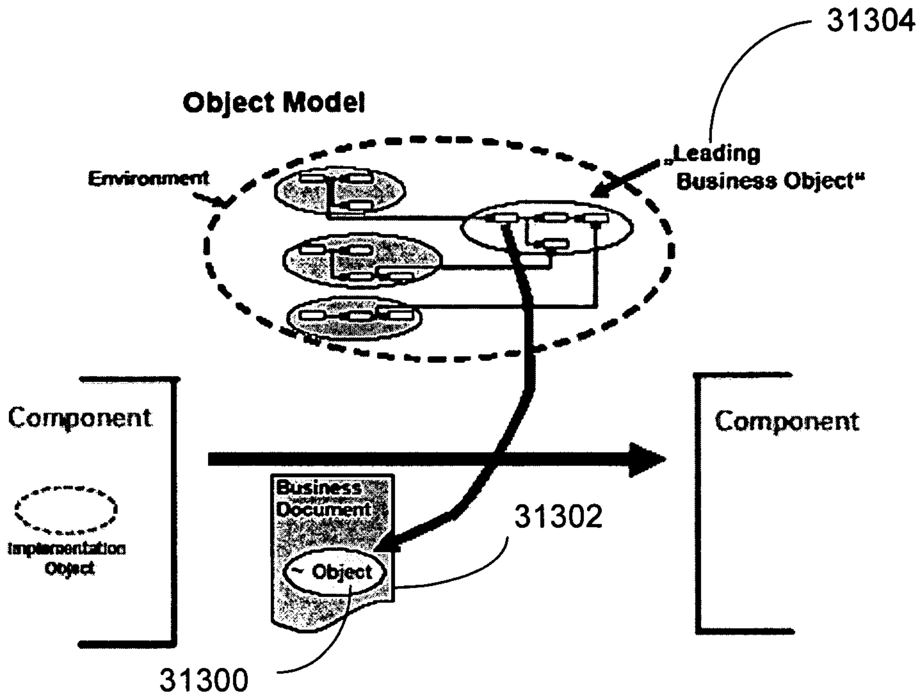
FIGS. 313-317 depict the hierarchization process in accordance with methods and systems consistent with the present invention.

Communication between components takes place via messages that contain business documents. The business document ensures a holistic business-related understanding for the recipient of the message. As depicted in FIG. 313, the object 31300 contained in the business document 31302 (i.e., the "business document object") refers in its semantics to a "leading" business object 31304, which represents a view of the business object and its environment.

The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object. The interface represents a usage-specific, hierarchical view of the underlying usage-neutral object model.

Figure 314:
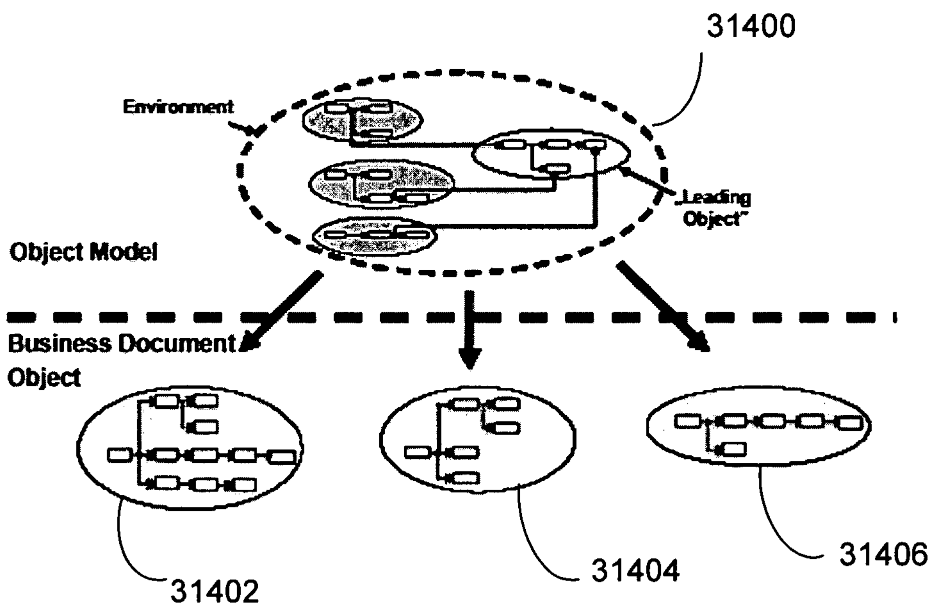

As illustrated in FIG. 314, several business document objects 31402, 31404, and 31406 as overlapping views may be derived for a given leading object 31400. Each business document object results from the object model by hierarchization.

Figure 315:
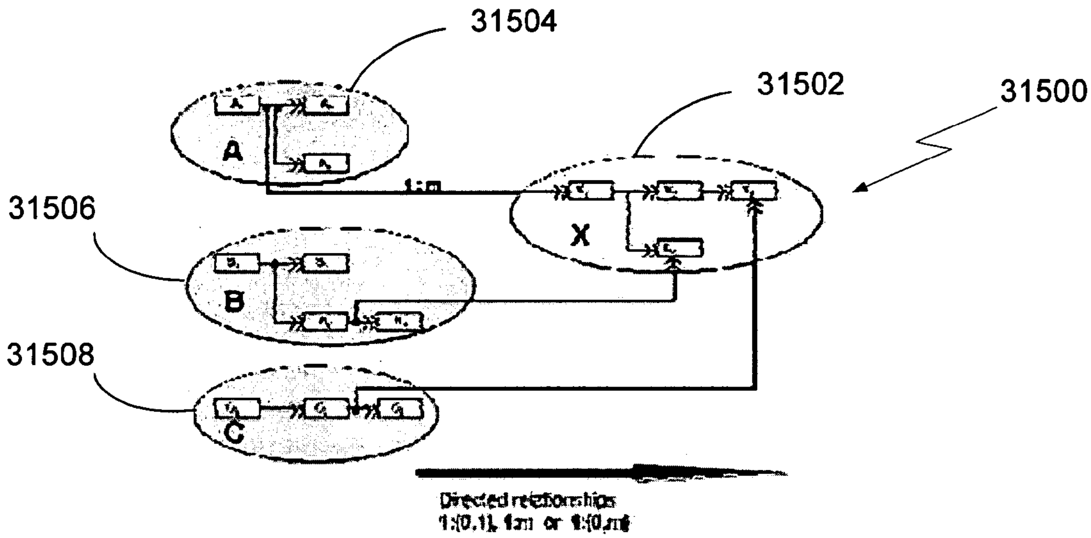

To illustrate the hierarchization process, FIG. 315 depicts an example of an object model 31500 (i.e., a portion of the business object model) that is used to derive an interface. As depicted, leading object X 31502 in the object model 31500 is integrated in a net of object A 31504, object B 31506, and object C 31508. Initially, the parts of the leading object 31502 that are required for the business object document are adopted. Based on these parts, the relationships to the superordinate objects (i.e., objects A, B, and C from which object X depends) 10 are inverted. In other words, these objects are adopted as dependent or subordinate objects in the new business object document.

When creating the interface structure, the internal structure of an object, which may be complex, is strictly hierarchized. Thus, dependent parts keep their dependency structure, and relationships between the parts within the object that do not represent the hierarchical structure are resolved by prioritizing one of the relationships.

For example, object A 31504, object B 31506, and object C 30508 have information that characterize object X. Because object A 31504, object B 31506, and object C 30508 are superordinate to leading object X 31502, the dependencies of these relationships change so that object A 31504, object B 31506, and object C 30508 become dependent and subordinate to leading object X 31502. This procedure is known as "derivation of the business document object by hierarchization."

Figure 316:
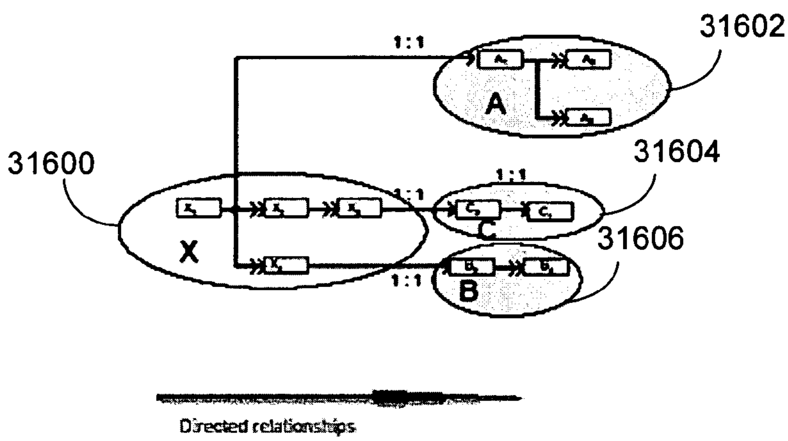
Figure 317:
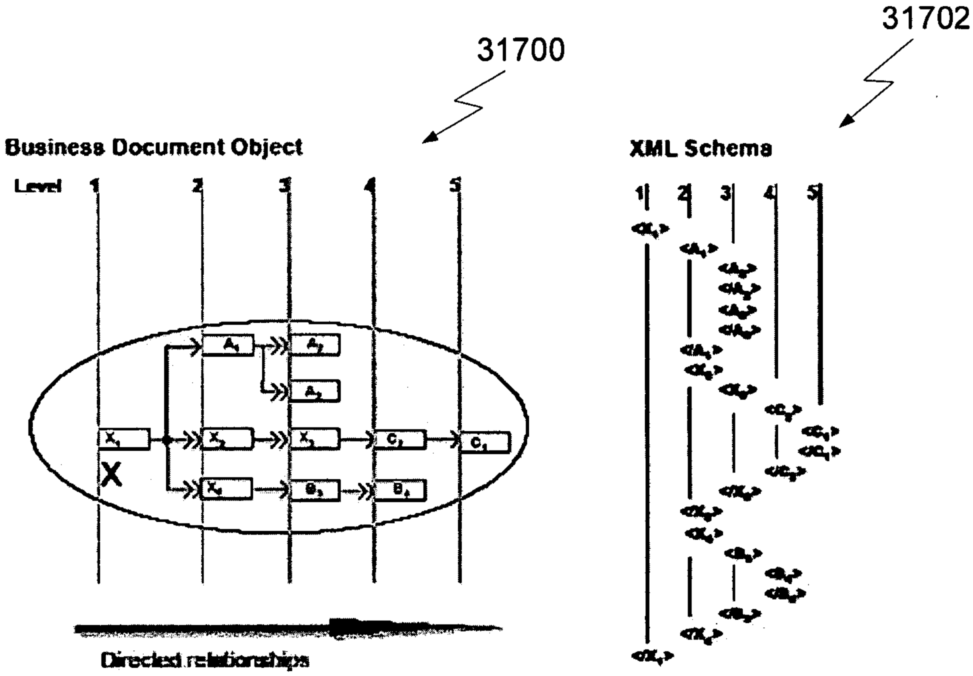

The newly created business document object contains all required information, including the incorporated master data information of the referenced objects. As depicted in FIG. 316, components $X_i$ in leading object X 31600 are adopted directly. The relationship of object X 31600 to object A 31602, object B 31604, and object C 31606 are inverted, and the parts required by these objects are added as objects that depend from object X 31600. As depicted, all of object A 31602 is adopted. $B_3$ and $B_4$ are adopted from object B 31604, but $B_1$ is not adopted. From object C 31606, $C_{2\ and\ C1}$ are adopted, but $C_3$ is not adopted. FIG. 317 depicts the business document object X 31700 created by this hierarchization process. As shown, the arrangement of the elements corresponds to their dependency levels, which directly leads to a corresponding representation as an XML structure 31702.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

Figure 268:
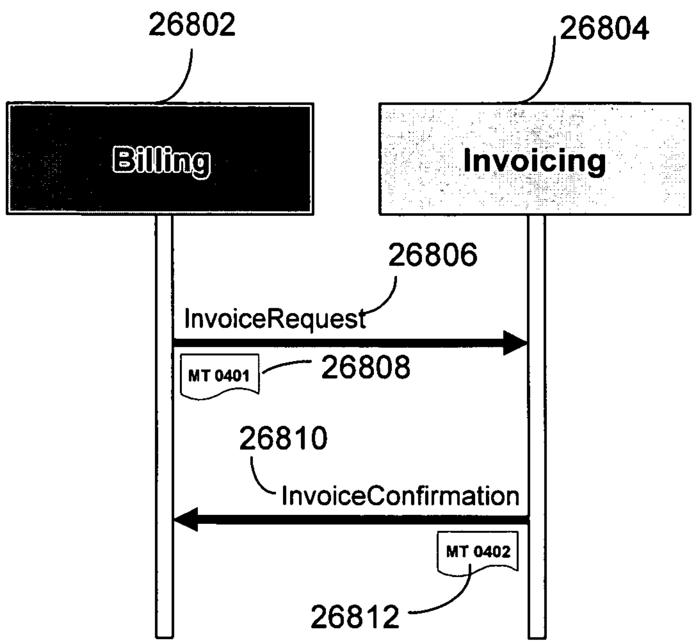
FIG. 268 depicts the message choreography for the Invoice interfaces in accordance with methods and systems consistent with the present invention.

FIG. 268 depicts the message choreography for the Invoice interface. The choreography involves two business entities: Billing 26802 and Invoicing 26804. Billing 26802 sends an InvoiceRequest message 26806 to Invoicing 26804. The message type 26808 of the InvoiceRequest message 26806 is 0401. Invoicing 26804 then sends Billing 26802 an InvoiceConfirmation message 26810. The message type 26812 of the Confirmation message 26810 is 0402.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 269A-F depict a flow diagram of the steps performed by methods and systems consistent with the present invention to generate an interface from the business object model. Although described as being performed by a computer, these steps may alternatively be performed manually, or using any combination thereof. The process begins when the system receives an indication of a package template from the designer, i.e., the designer provides a package template to the system (step 26900).

Package templates specify the arrangement of packages within a business transaction document. Package templates are used to define the overall structure of the messages sent between business entities. Methods and systems consistent with the present invention use package templates in conjunction with the business object model to derive the interfaces.

The system also receives an indication of the message type from the designer (step 26902). The system selects a package from the package template (step 26904), and receives an indication from the designer whether the package is required for the interface (step 26906). If the package is not required for the interface, the system removes the package from the package template (step 26908). The system then continues this analysis for the remaining packages within the package template (step 26910).

Figure 269A:
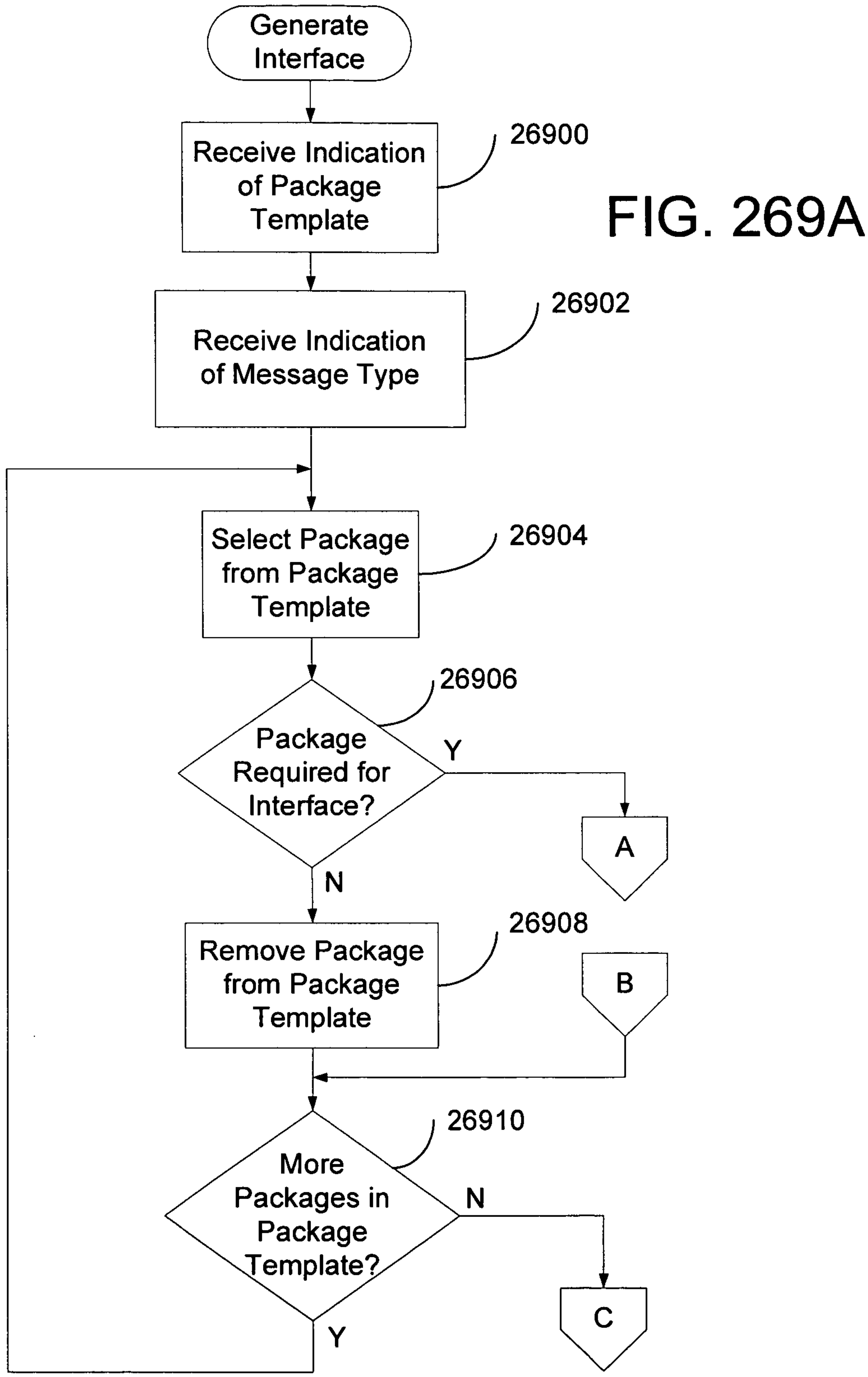
FIGS. 269A-F depict a flow diagram of the steps performed to generate an interface from the business object model in accordance with methods and systems consistent with the present invention.
Figure 269B:
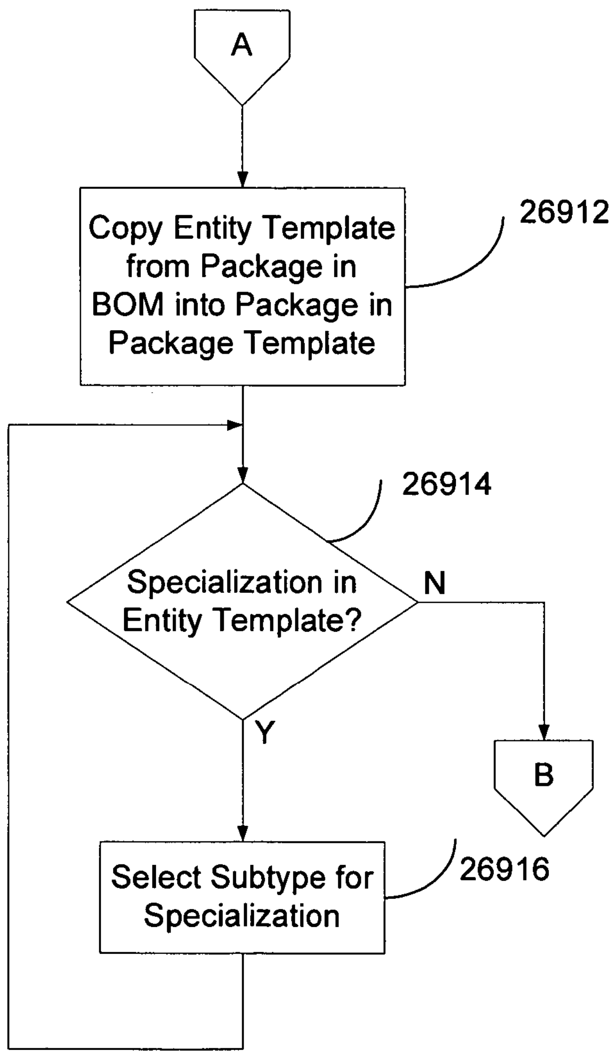
Figure 269C:
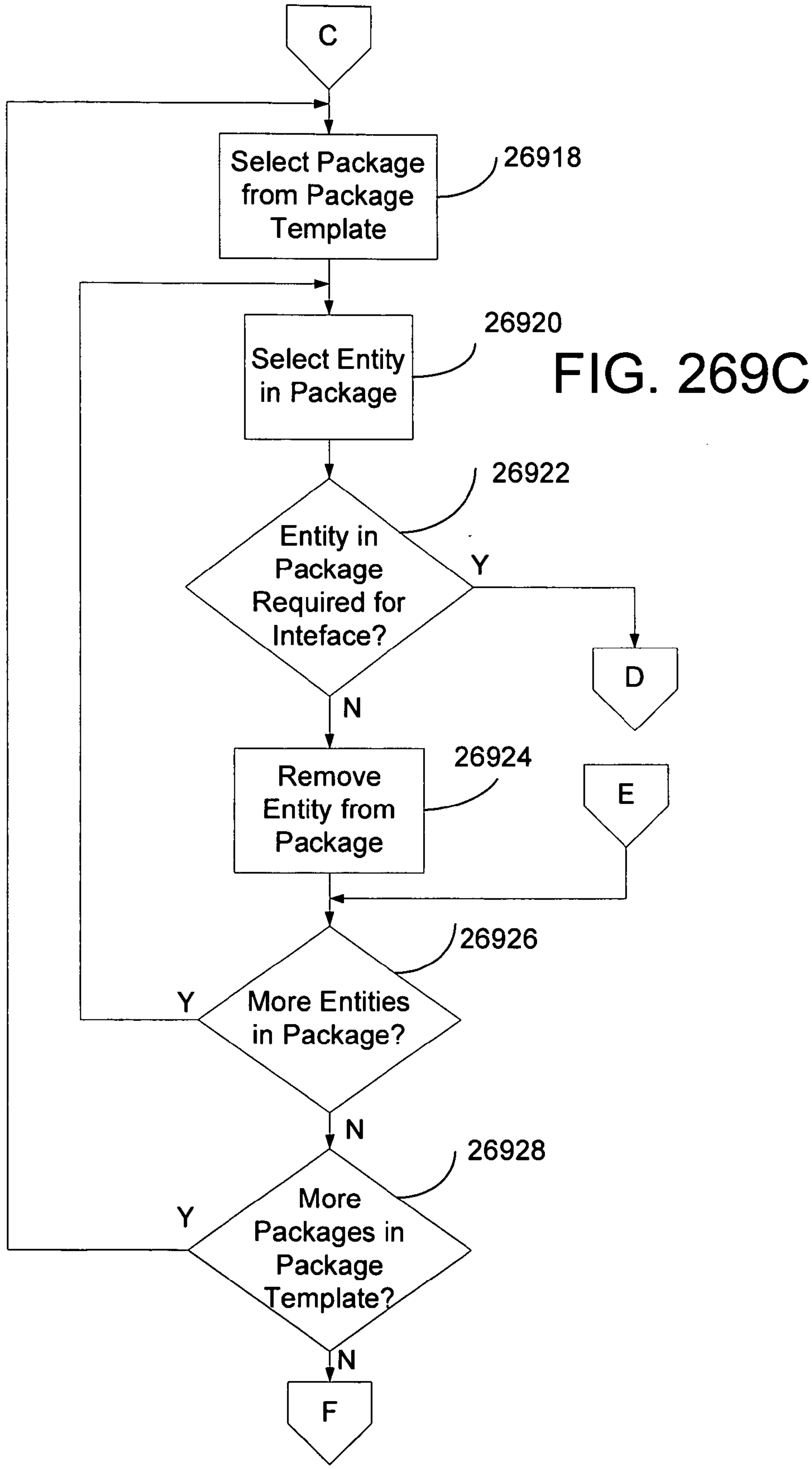

If, at step 26906, the package is required for the interface, the system copies the entity template from the package in the business object model into the package in the package template (step 26912, FIG. 269B). The system determines whether there is a specialization in the entity template (step 26914). If the system determines that there is a specialization in the entity template, the system selects a subtype for the specialization (step 26916). The system may either select the subtype for the specialization based on the message type, or it may receive this information from the designer. The system then determines whether there are any other specializations in the entity template (step 26914). When the system determines that there are no specializations in the entity template, the system continues this analysis for the remaining packages within the package template (step 26910, FIG. 269A).

At step 26910, after the system completes its analysis for the packages within the package template, the system selects one of the packages remaining in the package template (step 26918, FIG. 269C), and selects an entity from the package (step 26920). The system receives an indication from the designer whether the entity is required for the interface (step 26922) if the entity is not required for the interface, the system removes the entity from the package template (step 26924). The system then continues this analysis for the remaining entities within the package (step 26926), and for the remaining packages within the package template (step 26928).

Figure 269D:
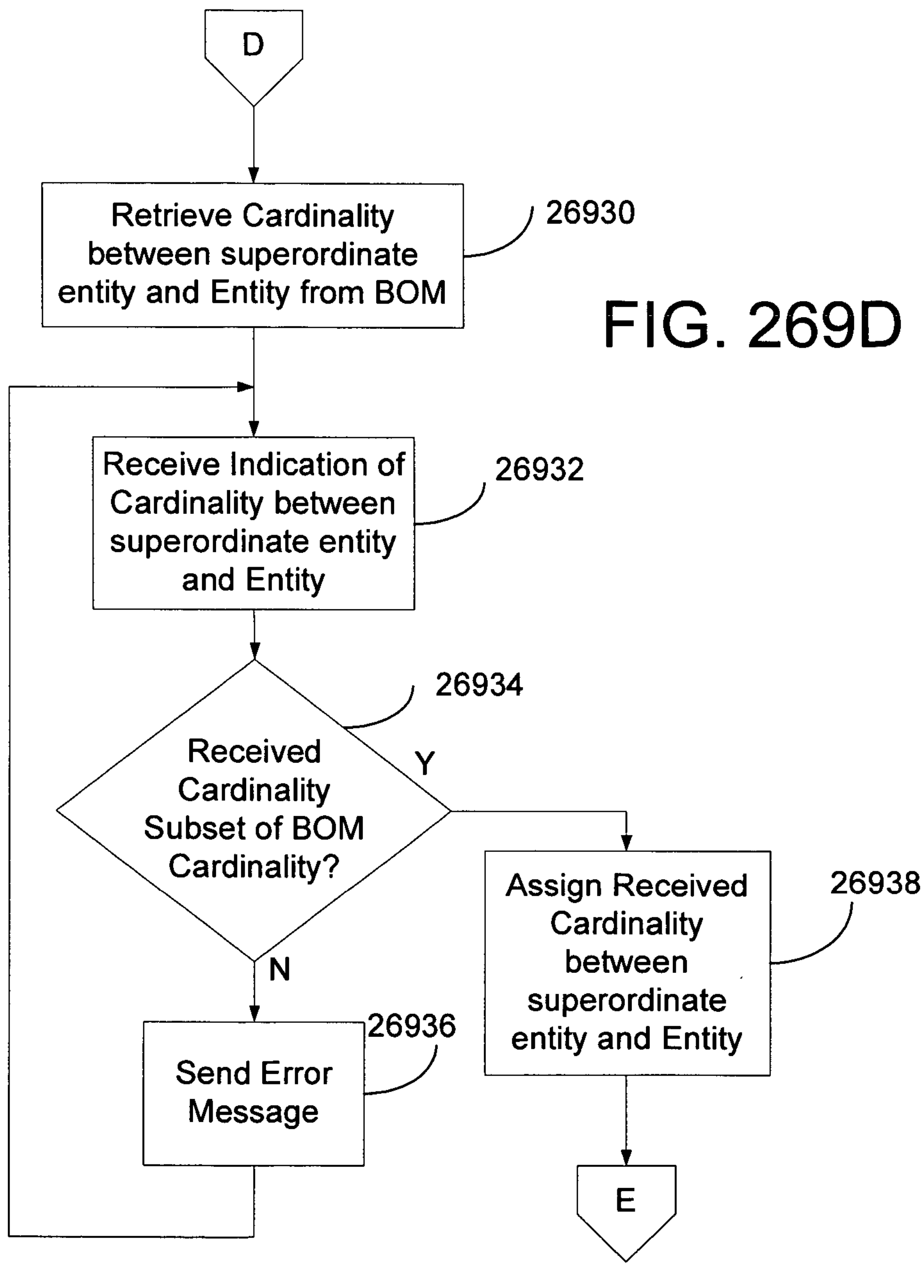

If, at step 26922, the entity is required for the interface, the system retrieves the cardinality between a superordinate entity and the entity from the business object model (step 26930, FIG. 269D). The system also receives an indication of the cardinality between the superordinate entity and the entity from the designer (step 26932). The system then determines whether the received cardinality is a subset of the business object model cardinality (step 26934). If the received cardinality is not a subset of the business object model cardinality, the system sends an error message to the designer (step 26936). If the received cardinality is a subset of the business object model cardinality, the system assigns the received cardinality as the cardinality between the superordinate entity and the entity (step 26938). The system then continues this analysis for the remaining entities within the package (step 26926, FIG. 269C), and for the remaining packages within the package template (step 26928).

Figure 269E:
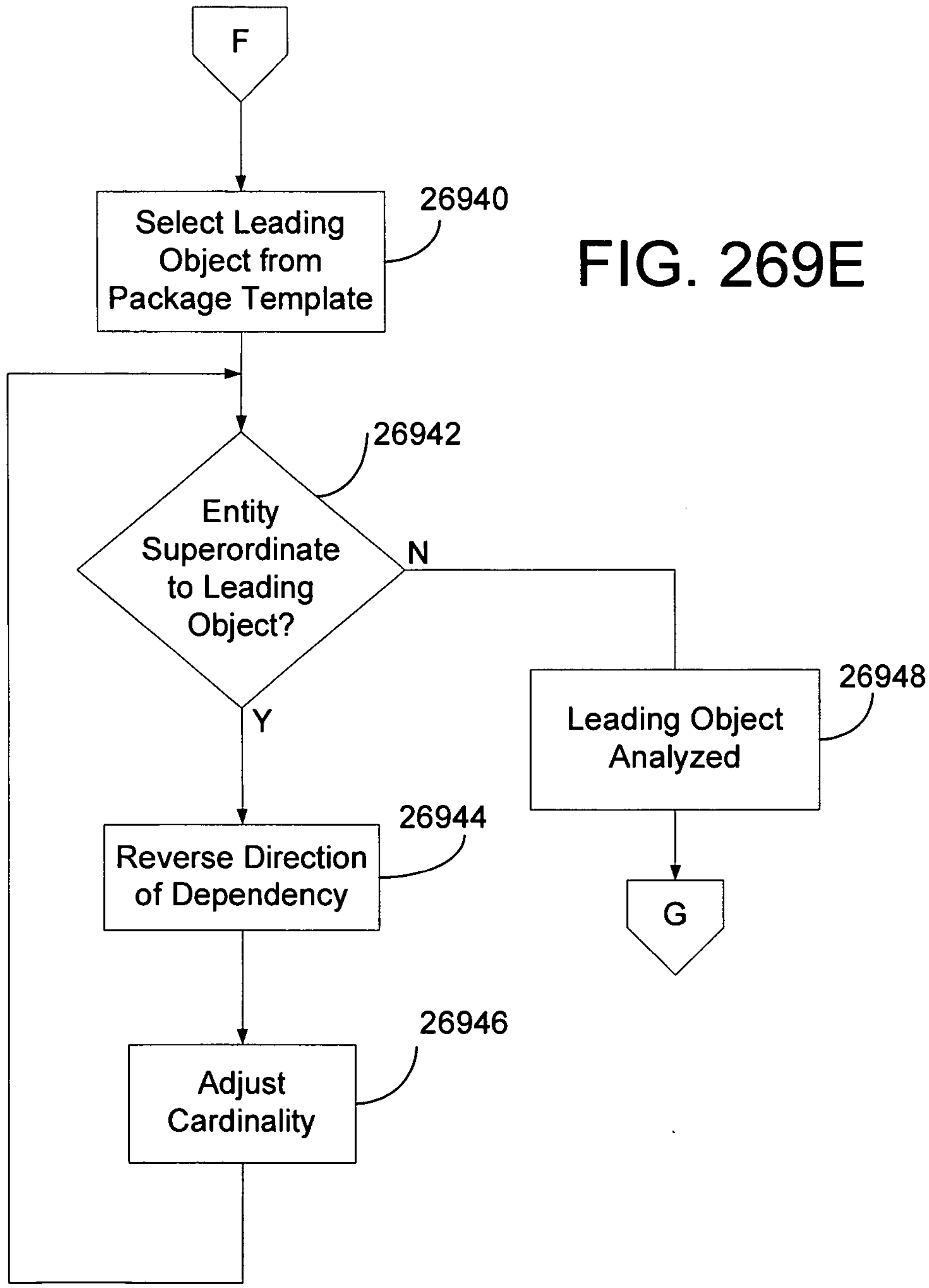
Figure 269F:
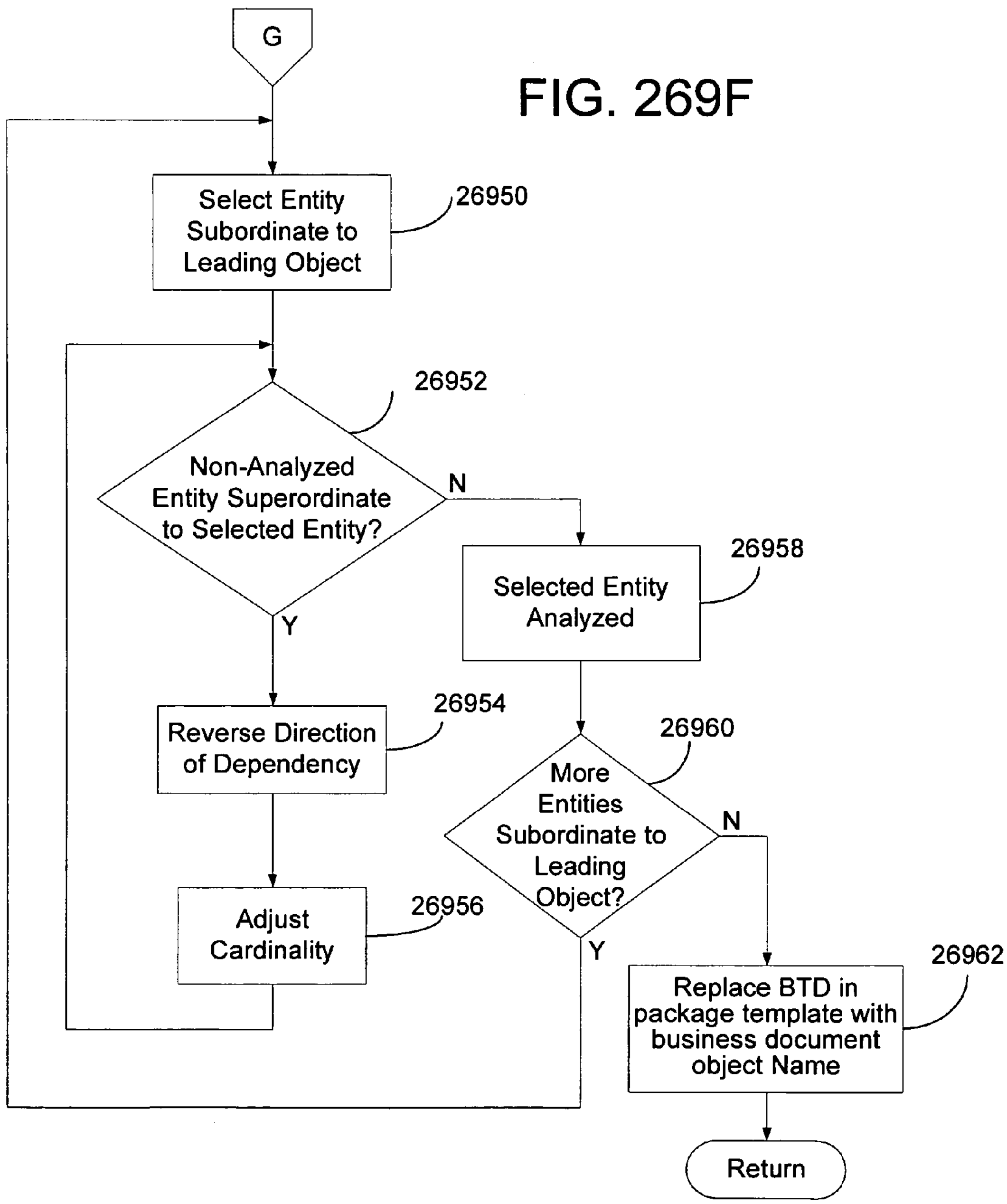

The system then selects a leading object from the package template (step 26940, FIG. 269E). The system determines whether there is an entity superordinate to the leading object (step 26942). If the system determines that there is an entity superordinate to the leading object, the system reverses the direction of the dependency (step 26944) and adjusts the cardinality between the leading object and the entity (step 26946). The system performs this analysis for entities that are superordinate to the leading object (step 26942). If the system determines that there are no entities superordinate to the leading object, the system identifies the leading object as analyzed (step 26948).

The system then selects an entity that is subordinate to the leading object (step 26950). The system determines whether any non-analyzed entities are superordinate to the selected entity (step 26952). If a non-analyzed entity is superordinate to the selected entity, the system reverses the direction of the dependency (step 26954) and adjusts the cardinality between the selected entity and the non-analyzed entity (step 26956). The system performs this analysis for non-analyzed entities that are superordinate to the selected entity (step 26952). If the system determines that there are no non-analyzed entities superordinate to the selected entity, the system identifies the selected entity as analyzed (step 26958), and continues this analysis for entities that are subordinate to the leading object (step 26960). After the packages have been analyzed, the system substitutes the BusinessTransactionDocument ("BTD") in the package template with the name of the interface (step 26962). This includes the "BTD" in the BTDItem package and the "BTD" in the BTDItemScheduleLine package.

Figure 270A:
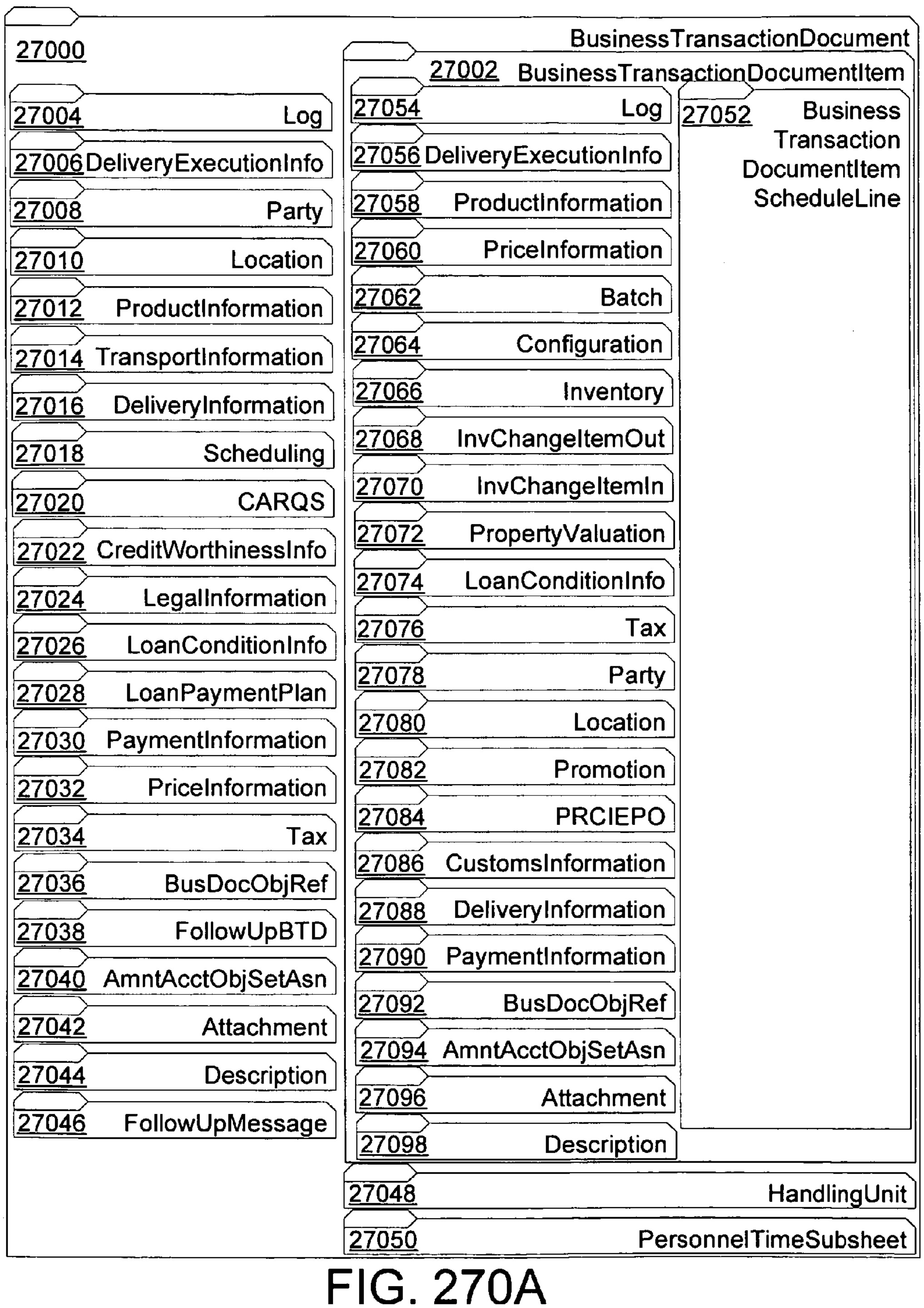
FIGS. 270A-C depict examples of package templates in accordance with methods and systems consistent with the present invention.

For example, FIG. 270A depicts an illustrative package template for a BusinessTransactionDocument 27000. Methods and systems consistent with the present invention use this package template to derive the interfaces unless otherwise specified. The package template includes a BusinessTransactionDocumentItem package 27002, a Log package 27004, a DeliveryExecutionInformation package 27006, a Party package 27008, a Location package 27010, a ProductInformation package 27012, a TransportInformation package 27014, a DeliveryInformation package 27016, a Scheduling package 27018, a CreditAgencyReportQueryService package 27020, a CreditWorthinessInformation package 27022, a LegalInformation package 27024, a LoanConditionInformation package 27026, a LoanPaymentPlan package 27028, a PaymentInformation package 27030, a PriceInformation package 27032, a Tax package 27034, a BusinessDocumentObjectReference package 27036, a FollowUpBusinessTransactionDocument package 27038, an AmountAccountingObjectSetAssignment package 27040, an Attachment package 27042, a Description package 27044, a FollowUpMessage package 27046, a HandlingUnit package 27048, and a PersonnelTimeSubsheet package 27050. The BusinessTransactionDocumentItem package 27002 includes a BusinessTransactionDocumentItemScheduleLine package 27052, a Log package 27054, a DeliveryExecutionInformation package 27056, a ProductInformation package 27058, a PriceInformation package 27060, a Batch package 27062, a Configuration package 27064, an Inventory package 27066, an InventoryChangeItemOutbound package 27068, an InventoryChangeItemInbound package 27070, a PropertyValuation package 27072, a LoanConditionInformation package 27074, a Tax package 27076, a Party package 27078, a Location package 27080, a Promotion package 27082, a PurchaseRequirementConfirmation-ItemExecutingPurchaseOrder package 27084, a CustomsInformation package 27086, a DeliveryInformation package 27088, a PaymentInformation package 27090, a BusinessDocumentObjectReference package 27092, an AmountAccountingObjectSetAssignment package 27094, an Attachment package 27096, and a Description package 27098.

Figure 270B:
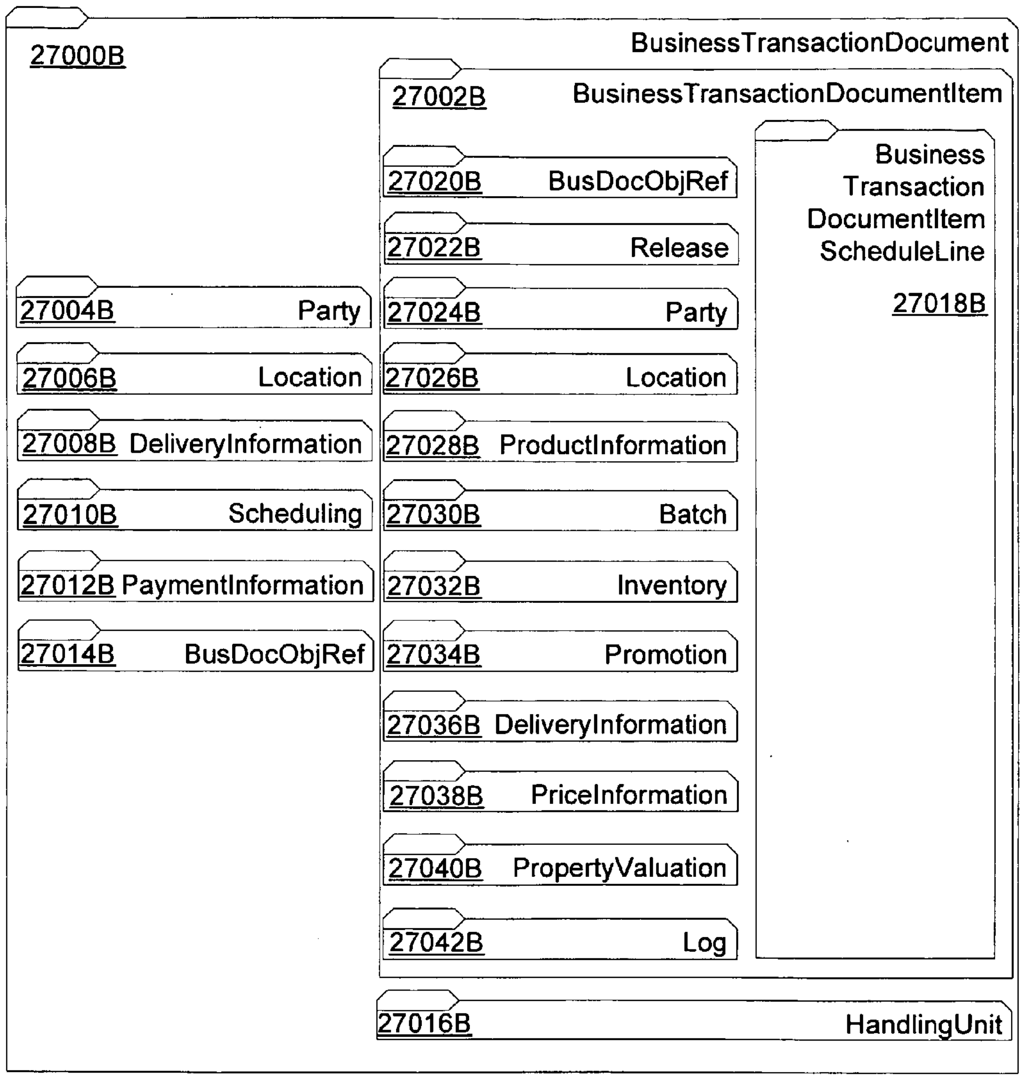

FIG. 270B depicts an illustrative package template for a BusinessTransactionDocument 27000B for an SCM. The package template includes a BusinessTransactionDocument-Item package 27002B, a Party package 27004B, a Location package 27006B, a DeliveryInformation package 27008B, a Scheduling package 27010B, a PaymentInformation package 27012B, a BusinessDocumentObjectReference package 27014B, and a HandlingUnit package 27016B. The BusinessTransactionDocumentItem package 27002B includes a BusinessTransactionDocumentItemScheduleLine package 27018B, a BusinessTransactionDocumentItemScheduleLine package 27020B, a Release package 27022B, a Party package 27024B, a Location package 27026B, a ProductInformation package 27028B, a Batch package 27030B, an Inventory package 27032B, a Promotion package 27034B, a DeliveryInformation package 27036B, a PriceInformation package 27038B, a PropertyValuation package 27040B, and a Log package 27042B.

Figure 270C:
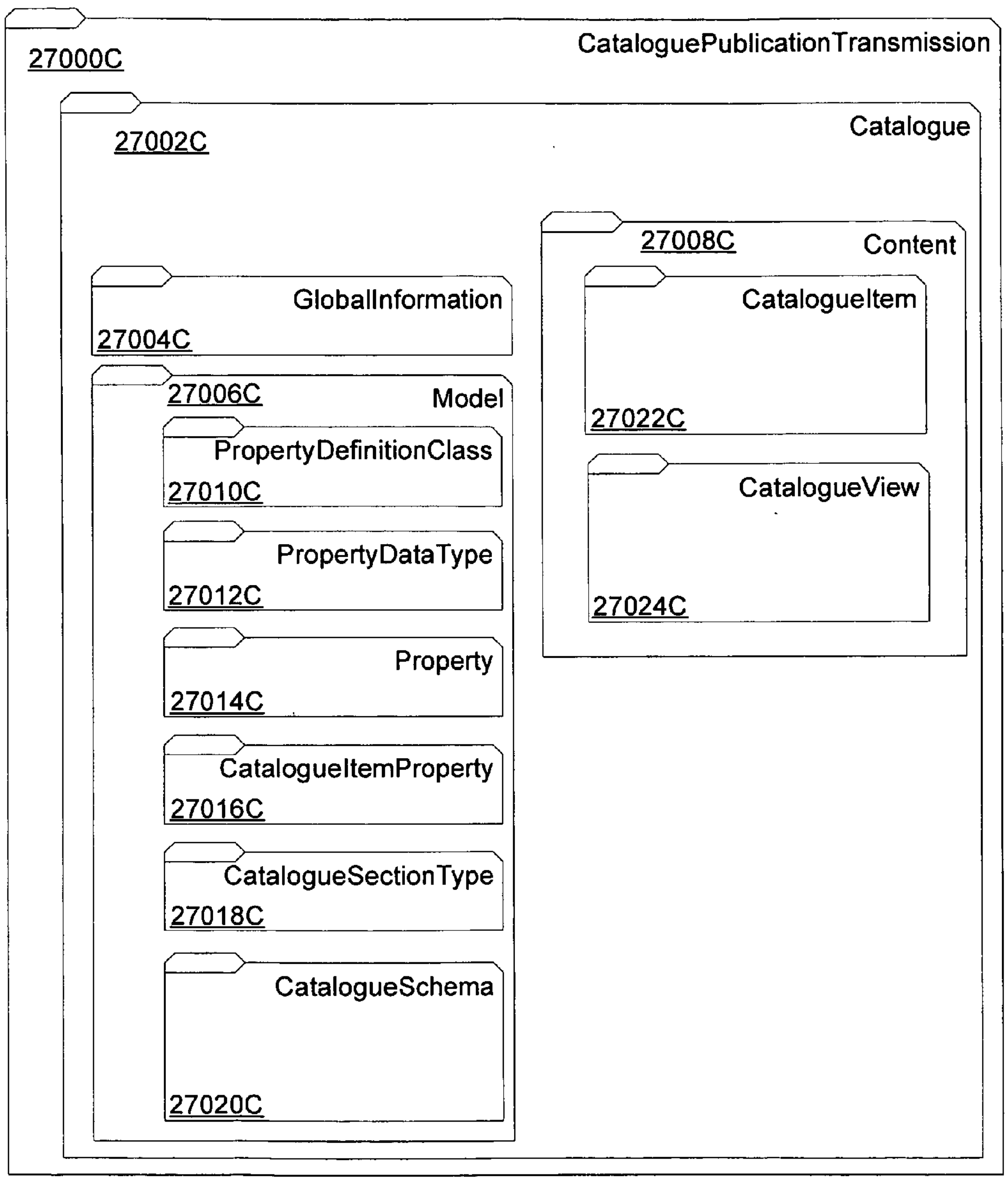

FIG. 270C depicts an illustrative package template for Master Data. The CataloguePublicationTransmission package template 27000C includes a Catalogue package 27002C. The Catalogue package 27002C includes a GlobalInformation package 27004C, a Model package 27006C, and a Content package 27008C. The Model package 27006C includes a PropertyDefinitionClass package 27010C, a PropertyDataType package 27012C, a Property package 27014C, a CatalogueItemProperty package 27016C, a CatalogueSectionType package 27018C, and a CatalogueSchema package 27020C. The Content package 27008C includes a CatalogueItem package 27022C and a CatalogueView package 27024C.

For example, to generate an Invoice Request using the BusinessTransactionDocument package template 27000 in FIG. 270A, the system initially selects the Log package 27004. After receiving an indication from the designer that the Log package 27004 is not required for the Invoice Request, the system removes the package from the package template. The system then selects the DeliveryExecutionInformation package 27006. After receiving an indication from the designer that the DeliveryExecutionInformation package 27006 is not required for the Invoice Request, the system removes this package from the package template, resulting in the BusinessTransactionDocument package depicted in FIG. 271. The system then selects the Party package 27008. After receiving an indication from the designer that the Party package 27008 is required for an Invoice Request, the system copies the entity template from the business object model into the Party package, as depicted in FIG. 272. The Party package entity template 27200 includes a BTDParty entity 27202, which is specialized into subtypes BTDBuyerParty entity 27204, BTDCreditorParty entity 27206, BTDSellerParty entity 27208, BTDDebtorParty entity 27210, BTDProductRecipientParty entity 27212, BTDVendorParty entity 27214, BTDManfacturerParty entity 27216, BTDPayerParty entity 27218, BTDPayeeParty entity 27220, BTDBillToParty entity 27222, BTDBillFromParty entity 27224, BTDCarrierParty entity 27226, BTDRequestorParty entity 27228, BTDPortalProviderParty entity 27230, BTDCatalogueProviderParty entity 27232, BTDBidderParty entity 27234, and BTDOwnerParty entity 27236.

Figure 273:
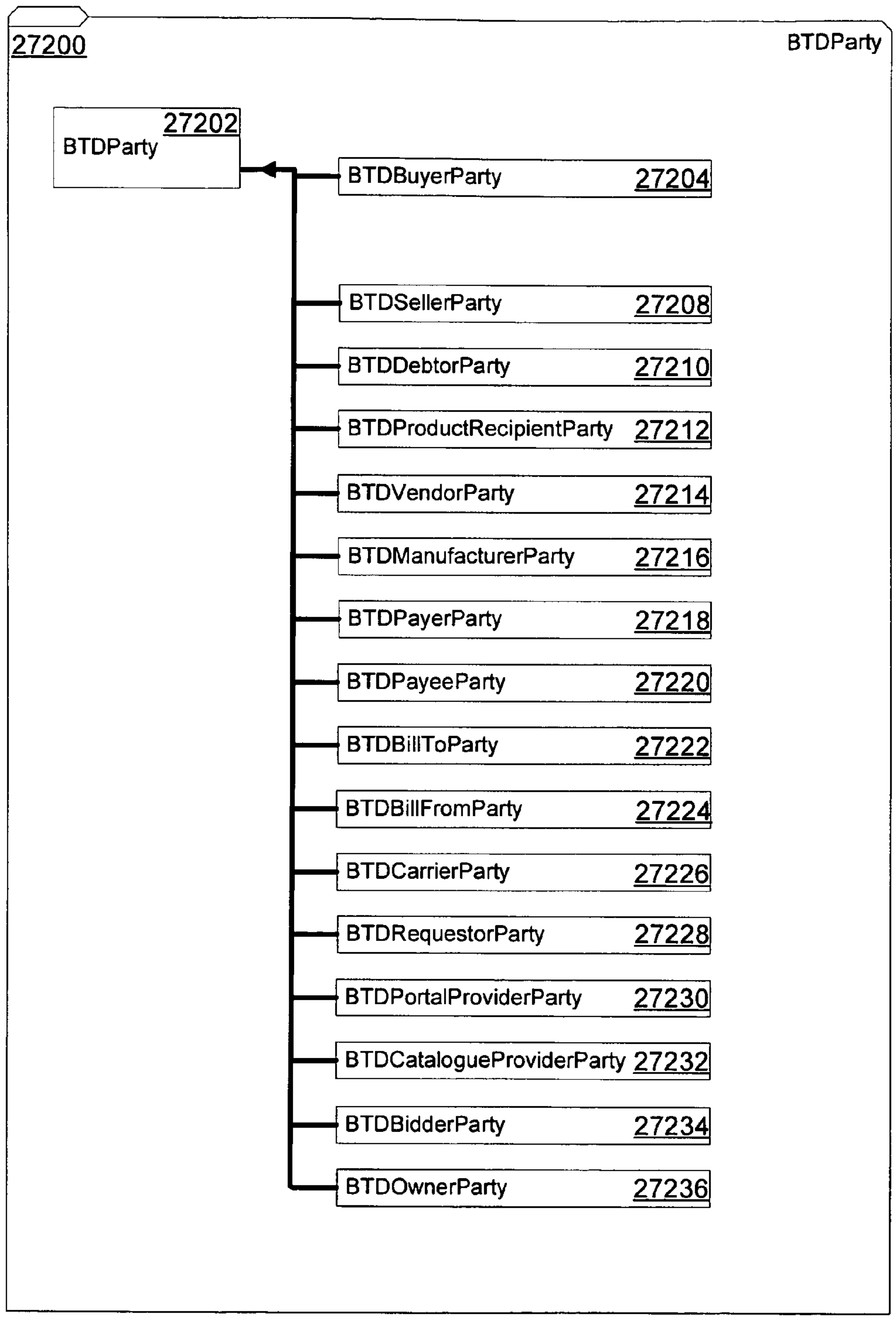
FIG. 273 depicts the entity template for the party package of FIG. 272 after removal of an entity in accordance with methods and systems consistent with the present invention.
Figure 274:
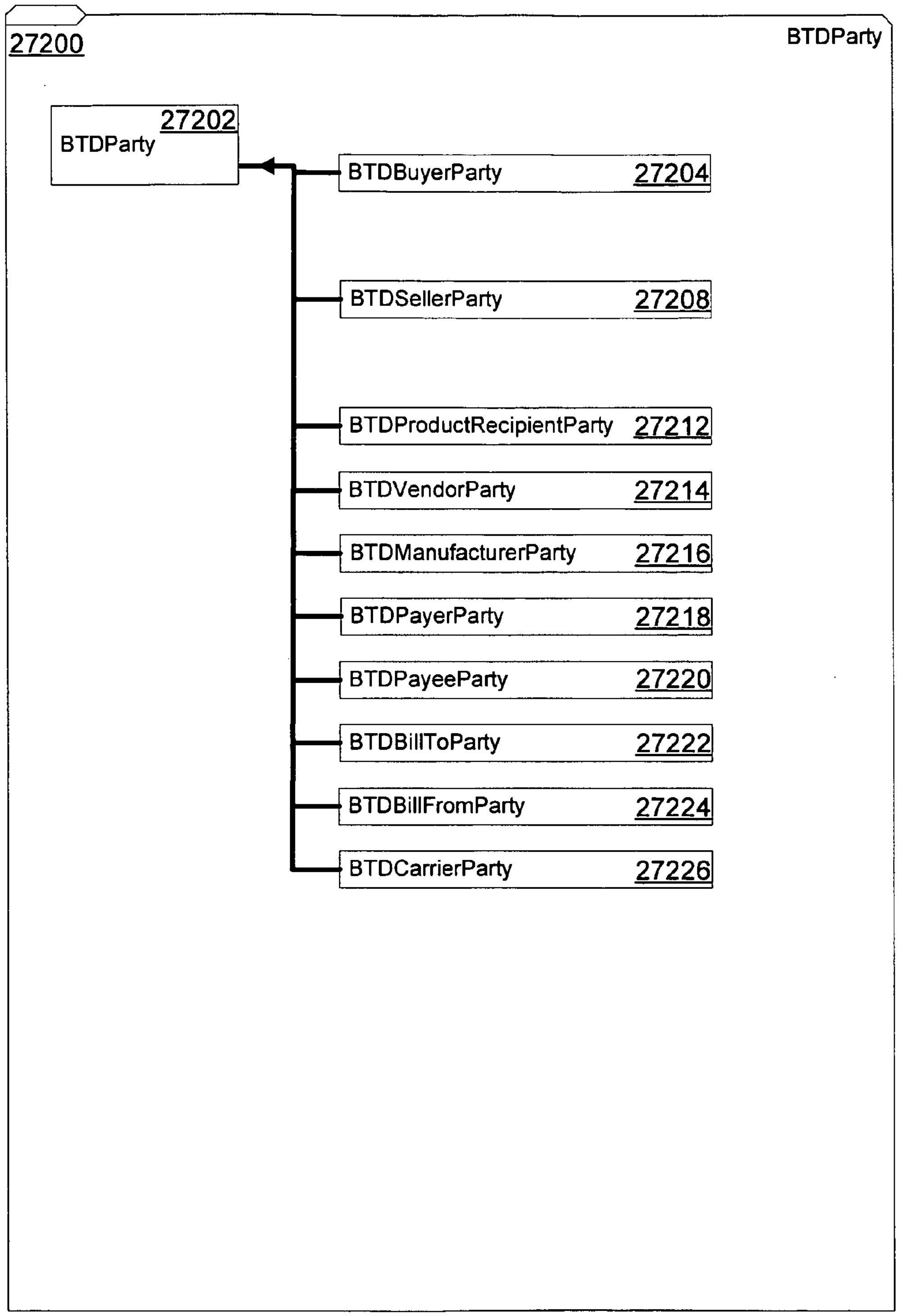
FIG. 274 depicts the party package of FIG. 272 after removal of the nonessential entities for the Invoice Request in accordance with methods and systems consistent with the present invention.

The system starts by selecting the BTDBuyerParty entity 27204. After receiving an indication from the designer that the BTDBuyerParty entity 27204 is required in the Invoice Request, the system proceeds to the next entity, the BTDCreditorParty entity 27206. After receiving an indication from the designer that the BTDCreditorParty entity 27206 is not required for the Invoice Request, the system removes this entity from the Party package, resulting in the Party package depicted in FIG. 273. The system continues with the remaining entities of the Party package, and ultimately removes the BTDCreditorParty entity 27206, the BTDDebtorParty entity 27210, the BTDRequestorParty entity 27228, the BTDPortalProviderParty entity 27230, the BTDCatalogueProviderParty entity 27232, the BTDBidderParty entity 27234, and the BTDOwnerParty entity 27236. FIG. 274 depicts the Party package after the system removes the nonessential entities for the Invoice Request.

Figure 275:
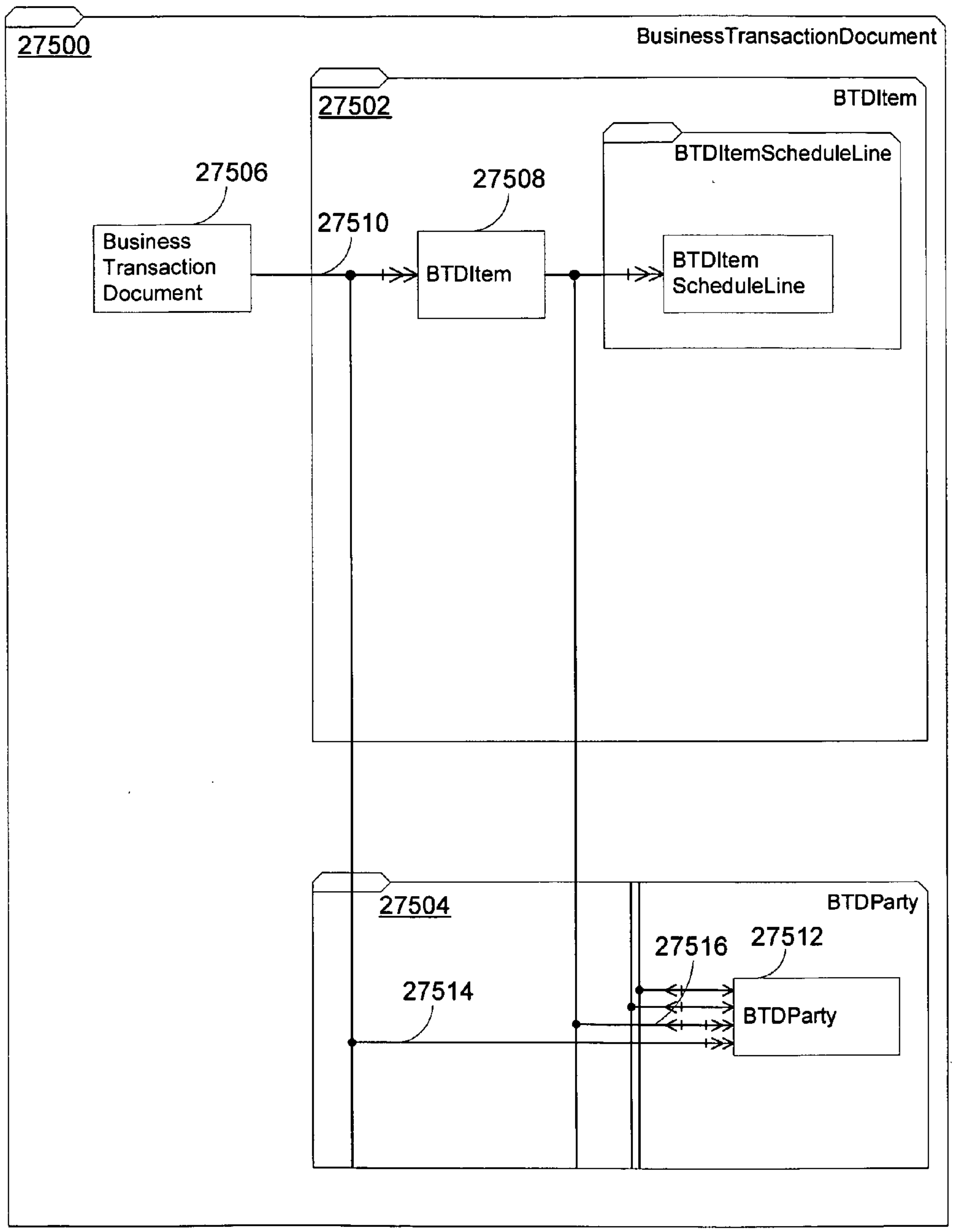
FIG. 275 depicts a portion of the business object model in accordance with methods and systems consistent with the present invention.
Figure 276:
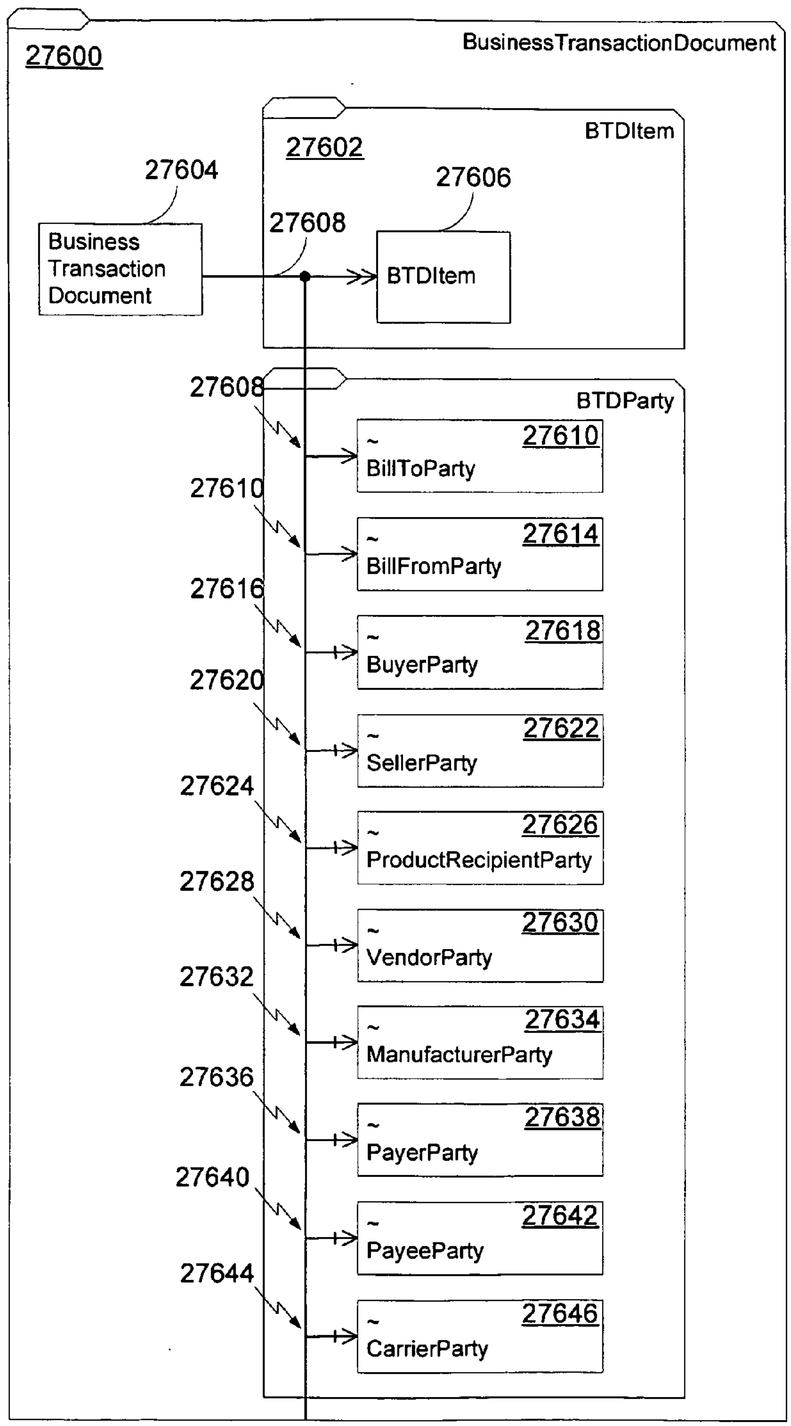
FIG. 276 depicts another portion of the business object model in accordance with methods and systems consistent with the present invention.

The system then retrieves the cardinality between the business transaction document and the entity from the business object model. In this example, the relevant portions of the business object model are depicted in FIG. 275. As depicted, the BusinessTransactionDocument package 27500 includes a BTDItem package 27502 and a BTDParty package 27504. The cardinality between the BusinessTransactionDocument entity 27506 and the BTDItem entity 27508, depicted by line 27510, indicates that there is a 1:cn relationship between the BusinessTransactionDocument entity 27506 and the BTDItem entity 27508 in the business object model. Because the designer may select a subset of this cardinality, the designer may select any cardinality between the BusinessTransactionDocument entity 27506 and the BTDItem entity 27508 in the Invoice Request. For the Invoice Request, the designer selects a 1:n relationship between the BusinessTransactionDocument entity 27604 and the BTDItem entity 27606, as depicted by the cardinality 27608, as depicted in FIG. 276.

The cardinality between the BusinessTransactionDocument entity 27506 and the BTDParty entity 27512, depicted by line 27514, indicates that there is a 1:cn relationship between the BusinessTransactionDocument entity 27506 and the BTDParty entity 27512. Thus, the designer may select any cardinality between the BusinessTransactionDocument entity 27506 and the BTDParty entity 27512 in the Invoice Request. As depicted in FIG. 276, the designer selects a 1:1 relationship between the BusinessTransactionDocument entity 27604 and the BillToParty entity 27610, as depicted by the cardinality 27608. The designer also selects a 1:1 relationship between the BusinessTransactionDocument entity 27604 and the BillFromParty entity 27614, as depicted by the cardinality 27610. The designer selects a 1:c relationship between the BusinessTransactionDocument entity 27604 and the BuyerParty entity 27618, the SellerParty entity 27622, the ProductRecipientParty entity 27626, the VendorParty entity 27630, the ManufacturerParty entity 27634, the PayerParty entity 27638, the PayeeParty entity 27642, and the CarrierParty entity 27646 as depicted by the cardinalities 27616, 27620, 27624, 27628, 27632, 27636, 27640, and 27644, respectively.

Figure 271:
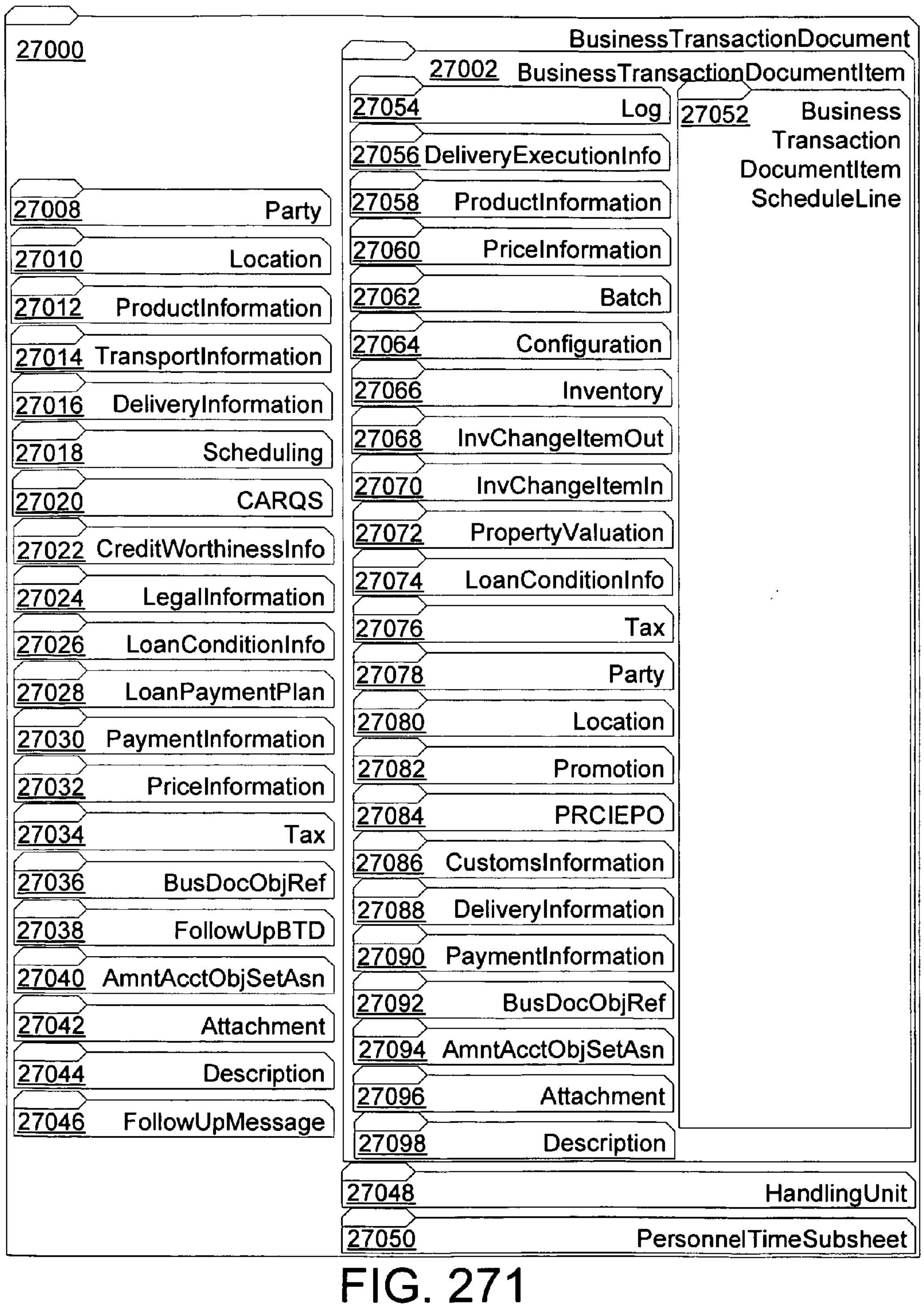
FIG. 271 depicts the package template of FIG. 270A after the removal of a package in accordance with methods and systems consistent with the present invention.
Figure 272:
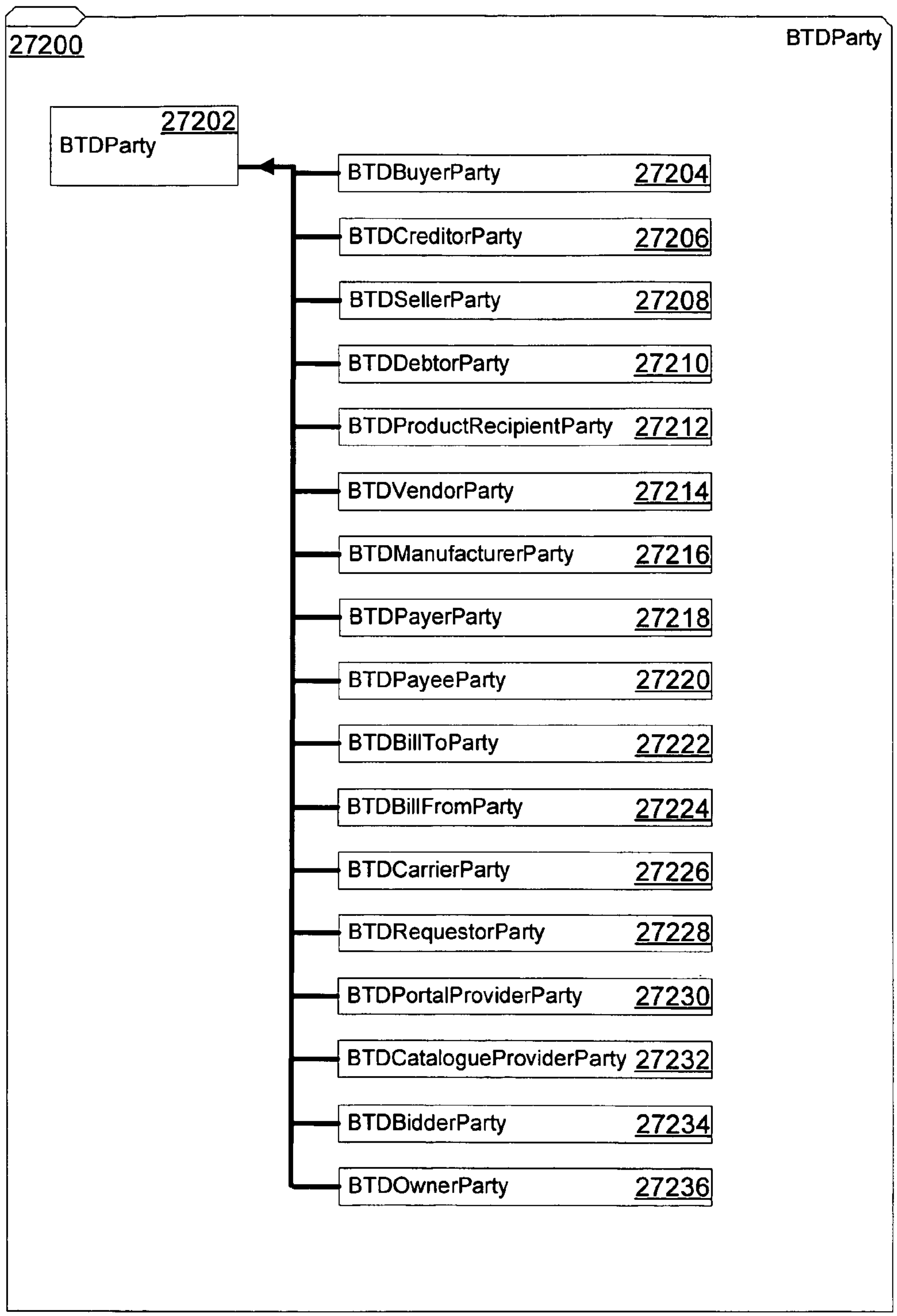
FIG. 272 depicts the entity template for the party package from the business object model in accordance with methods and systems consistent with the present invention.
Figure 277:
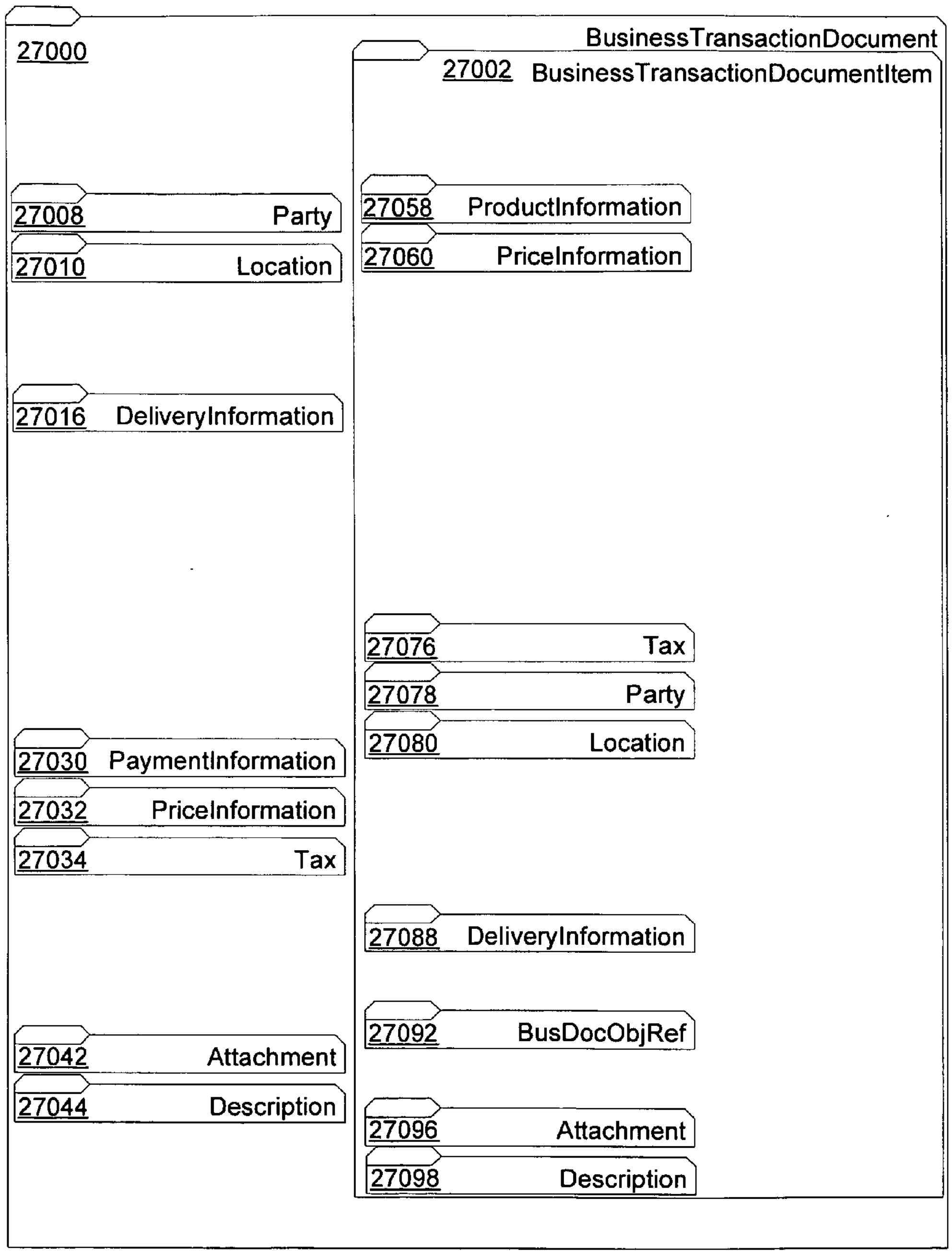
FIG. 277 depicts the package template of FIG. 270A after the removal of the nonessential packages for the Invoice Request in accordance with methods and systems consistent with the present invention.
Figure 278:
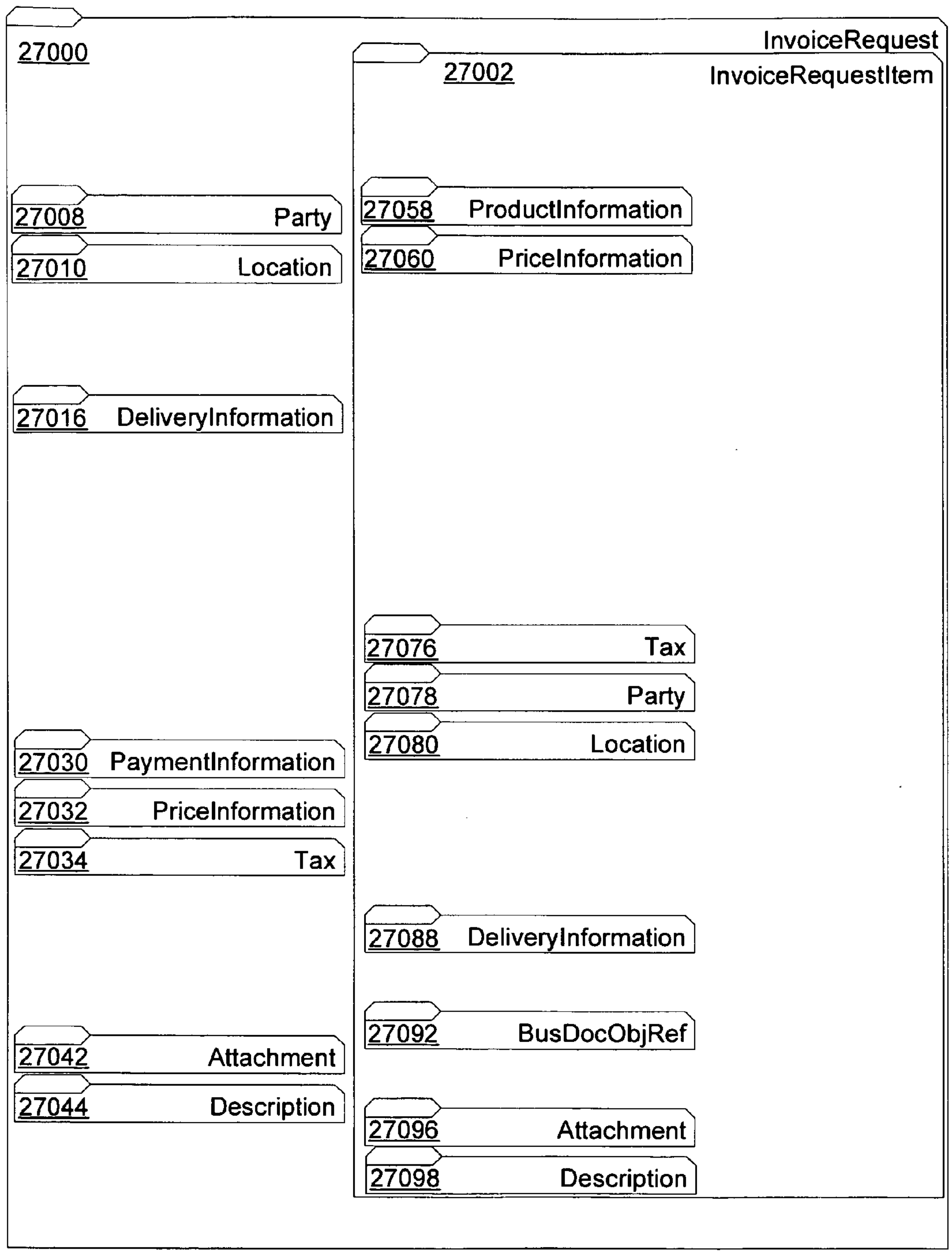
FIG. 278 depicts package template of FIG. 277 after the "business transaction document" is changed in accordance with methods and systems consistent with the present invention.

The system then selects the next package from the package template 27000 depicted in FIG. 271, i.e., the Location package 27010, and continues removing packages that are not required in an Invoice Request. The system ultimately removes the Log package 27004, the DeliveryExecutionInformation package 27006, the ProductInformation package 27012, the TransportInformation package 27014, the Scheduling package 27018, the CreditAgencyReportQueryService package 27020, the CreditWorthinessInformation package 27022, the LegalInformation package 27024, the LoanConditionInformation package 27026, the LoanPaymentPlan package 27028, the BusinessDocumentObjectReference package 27036, the FollowUpBusinessTransactionDocument package 27038, the AmountAccountingObjectSetAssignment package 27040, the FollowUpMessage package 27046, the HandlingUnit package 27048, and the PersonnelTimeSubsheet package 27050 from the BusinessTransactionDocument package 27000, and the Log package 27054, the DeliveryExecutionInformation package 27056, the Batch package 27062, the Configuration package 27064, the Inventory package 27066, the InventoryChangeItemOutbound package 27068, the InventoryChangeItemInbound package 27070, the PropertyValuation package 27072, the LoanConditionInformation package 27074, the Promotion package 27082, the PurchaseRequirementConfirmationItemExecutingPurchaseOrder package 27084, the CustomsInformation package 27086, the PaymentInformation package 27090, the AmountAccountingObjectSetAssignment package 27094, and the BusinessTransactionDocumentItemScheduleLine package 27052, from the BusinessTransactionDocumentItem package 27002. FIG. 277 depicts the package template after the system removes nonessential packages for the Invoice Request. FIG. 278 depicts the InvoiceRequest package after the system substitutes the "BusinessTransactionDocument" in the package template with "Invoice Request," i.e., the name of the interface.

Each interface may be represented either as a data model or an element structure. The data model depicts the layout of the interface. Thus, the data model illustrates the arrangement of the various elements within the interface. The element structure, on the other hand, provides the details regarding each of the elements of the interface.

Figure 279A:
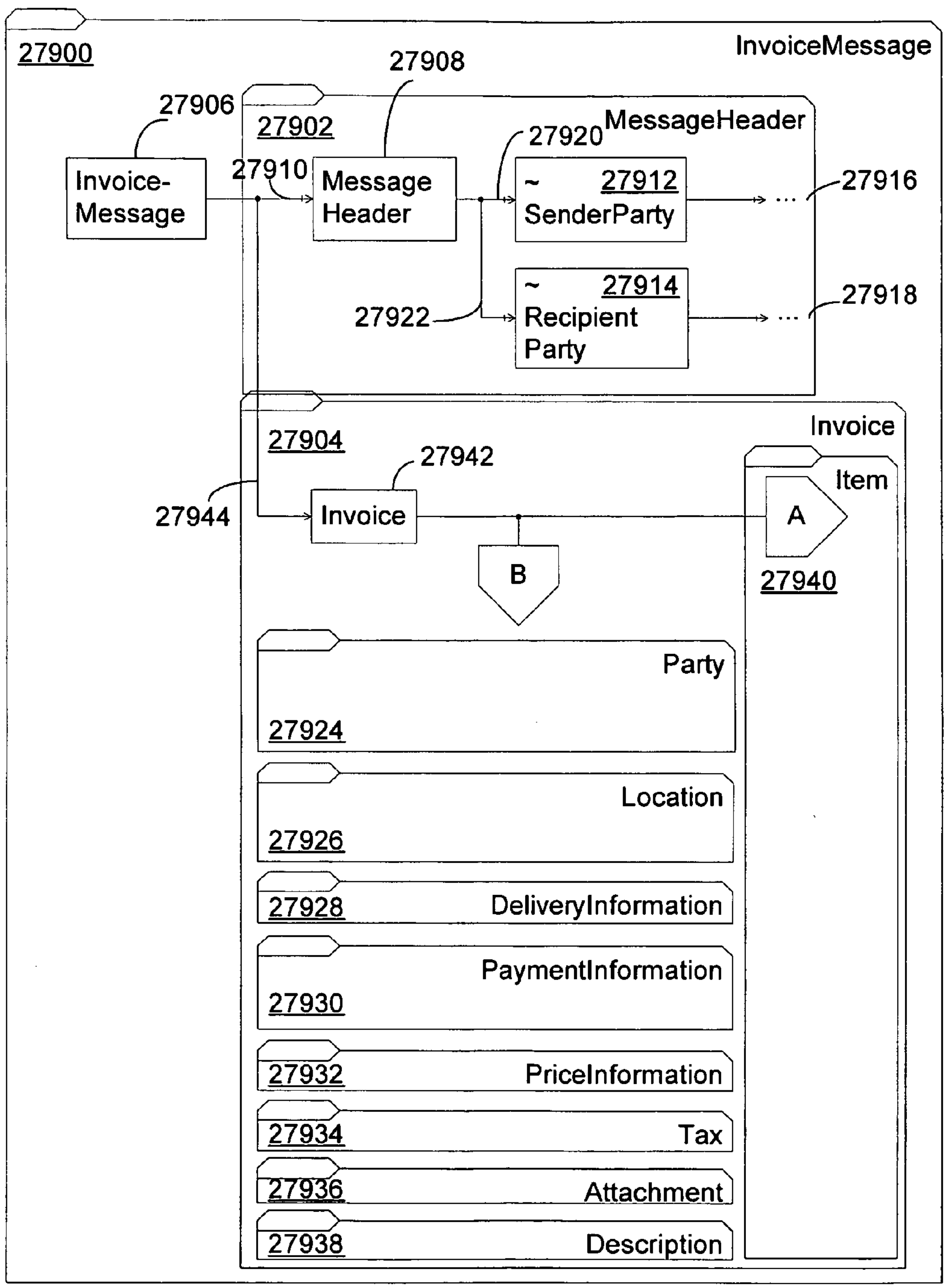
FIGS. 279A-N depict the data model for the Invoice interfaces in accordance with methods and systems consistent with the present invention.
Figure 279B:
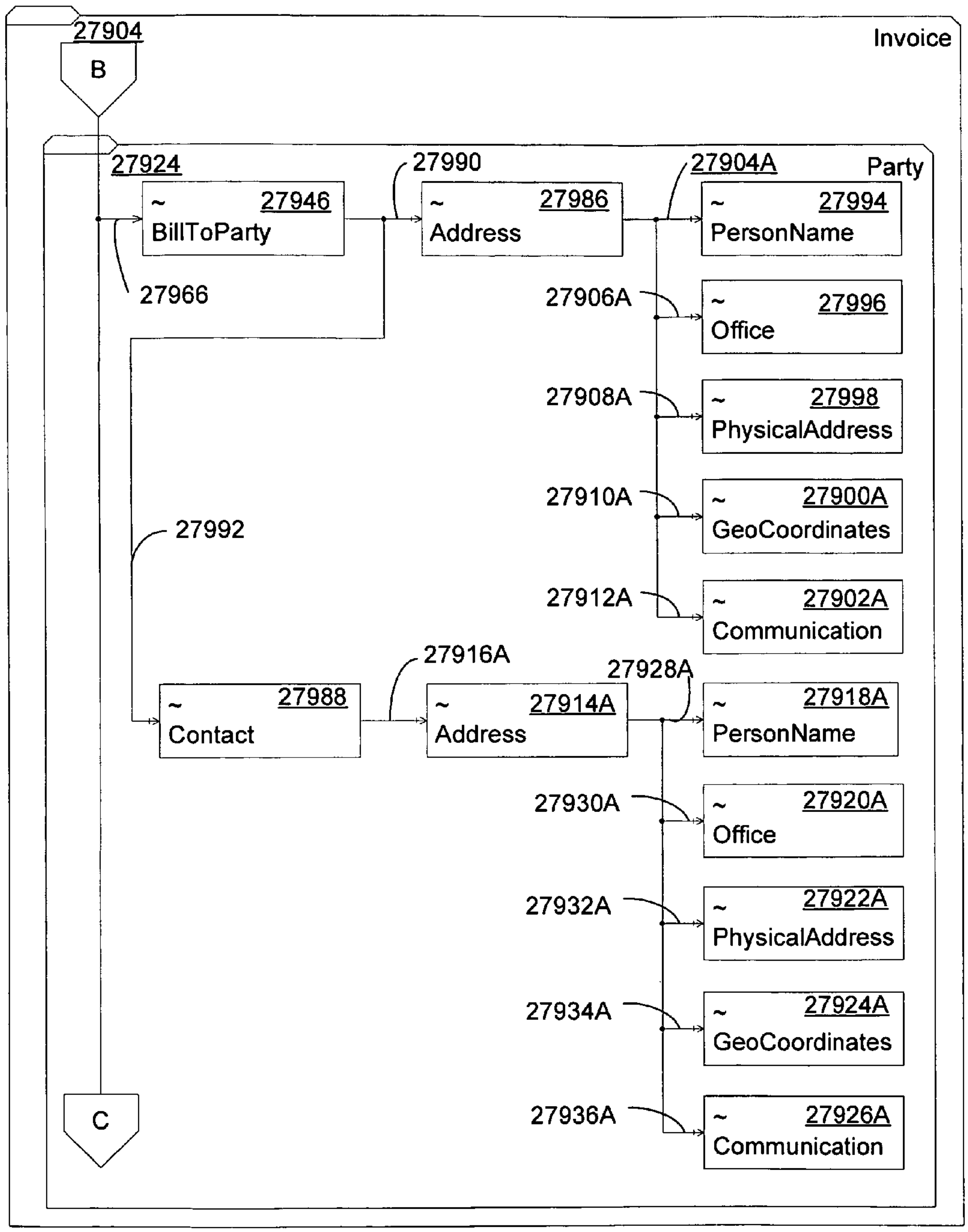
Figure 279C:
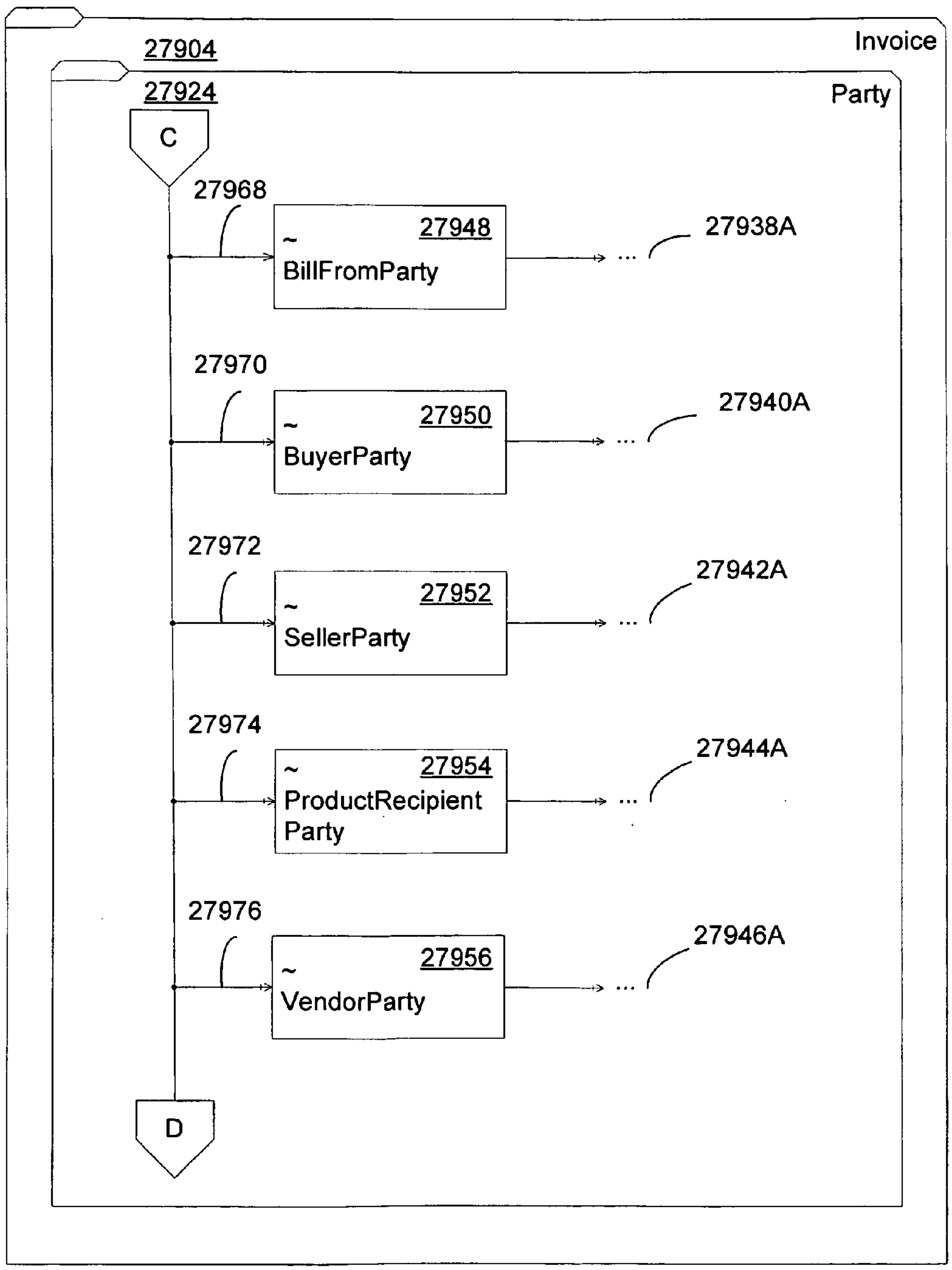
Figure 279D:
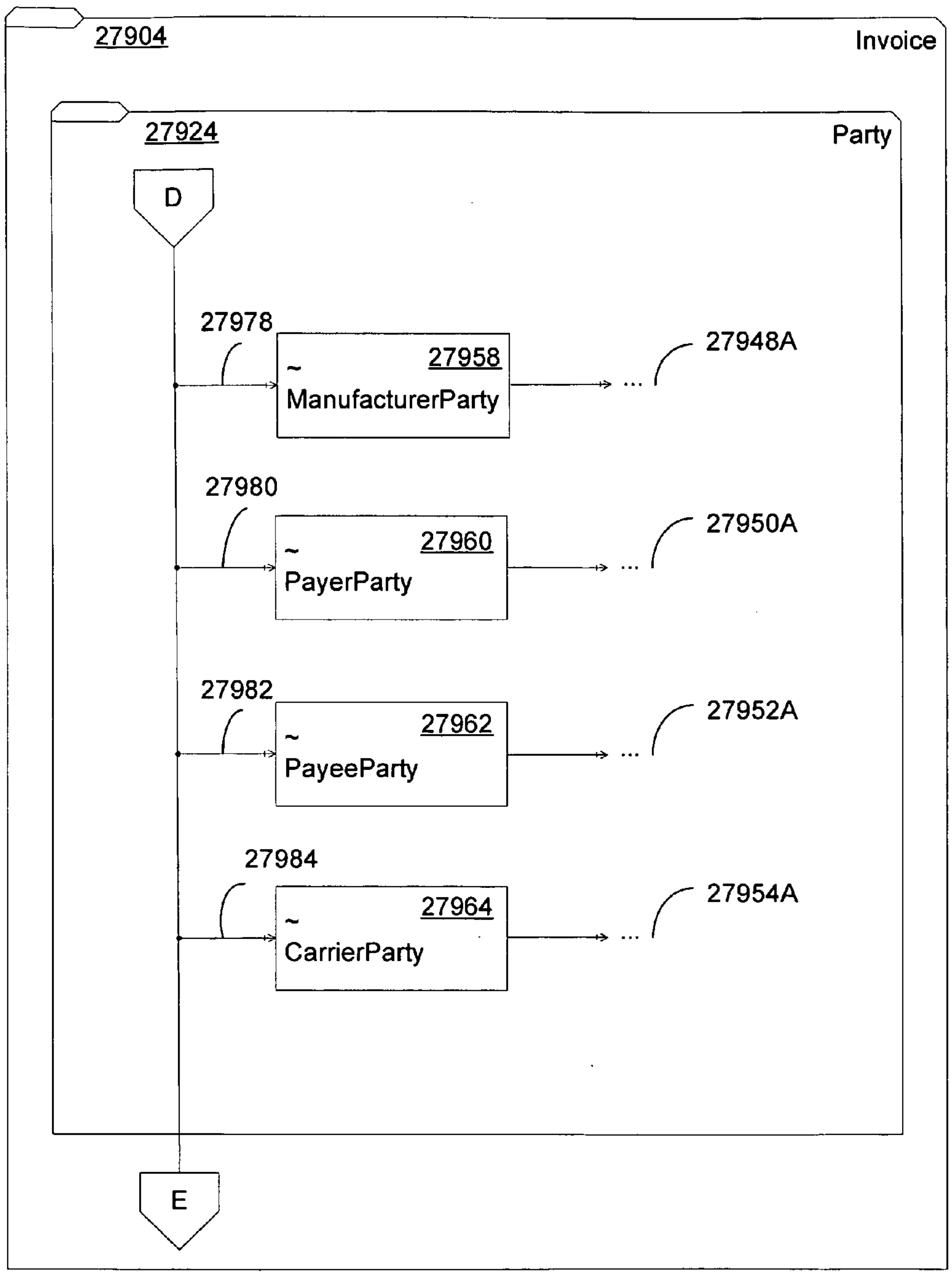
Figure 279E:
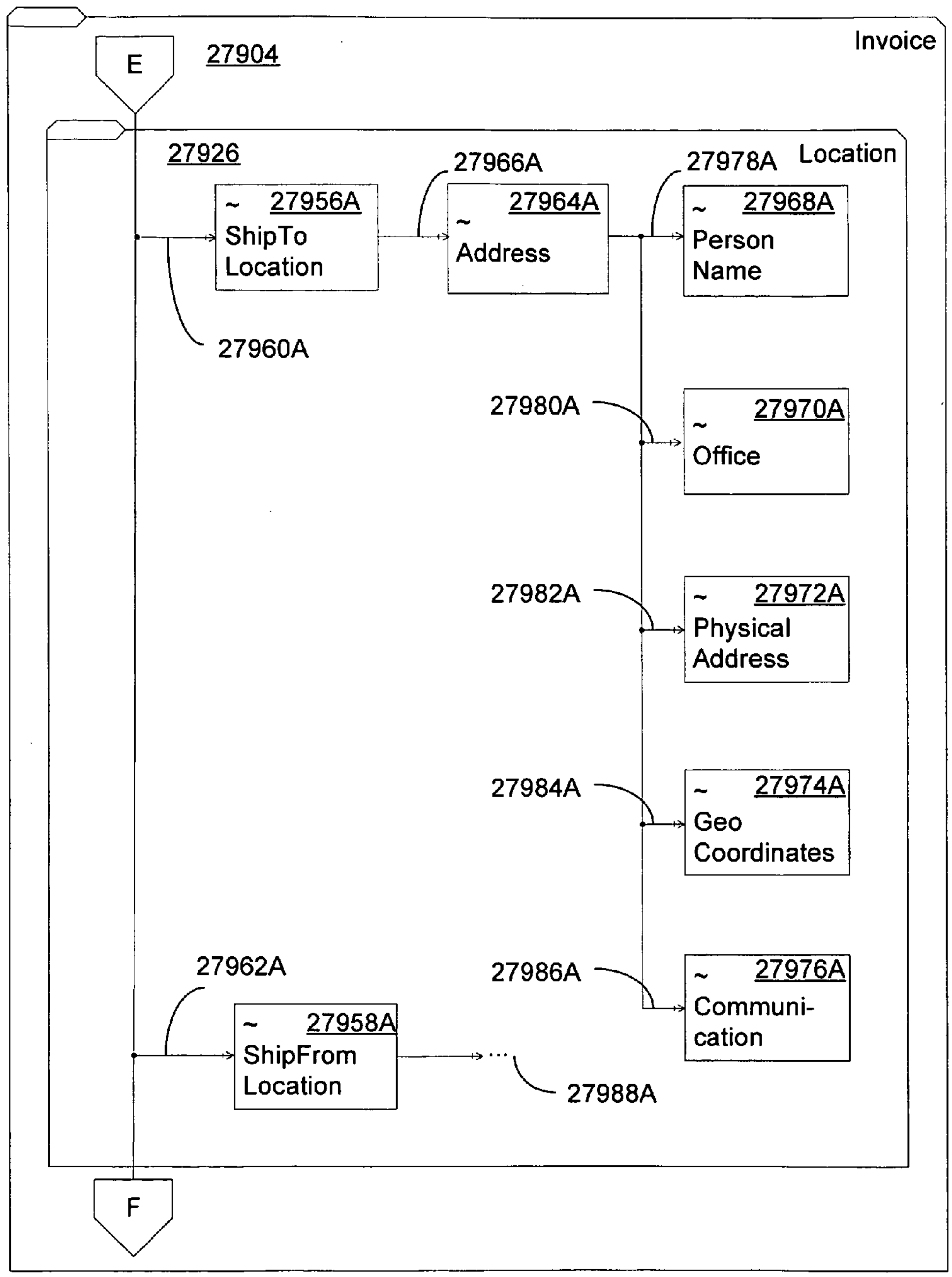
Figure 279F:
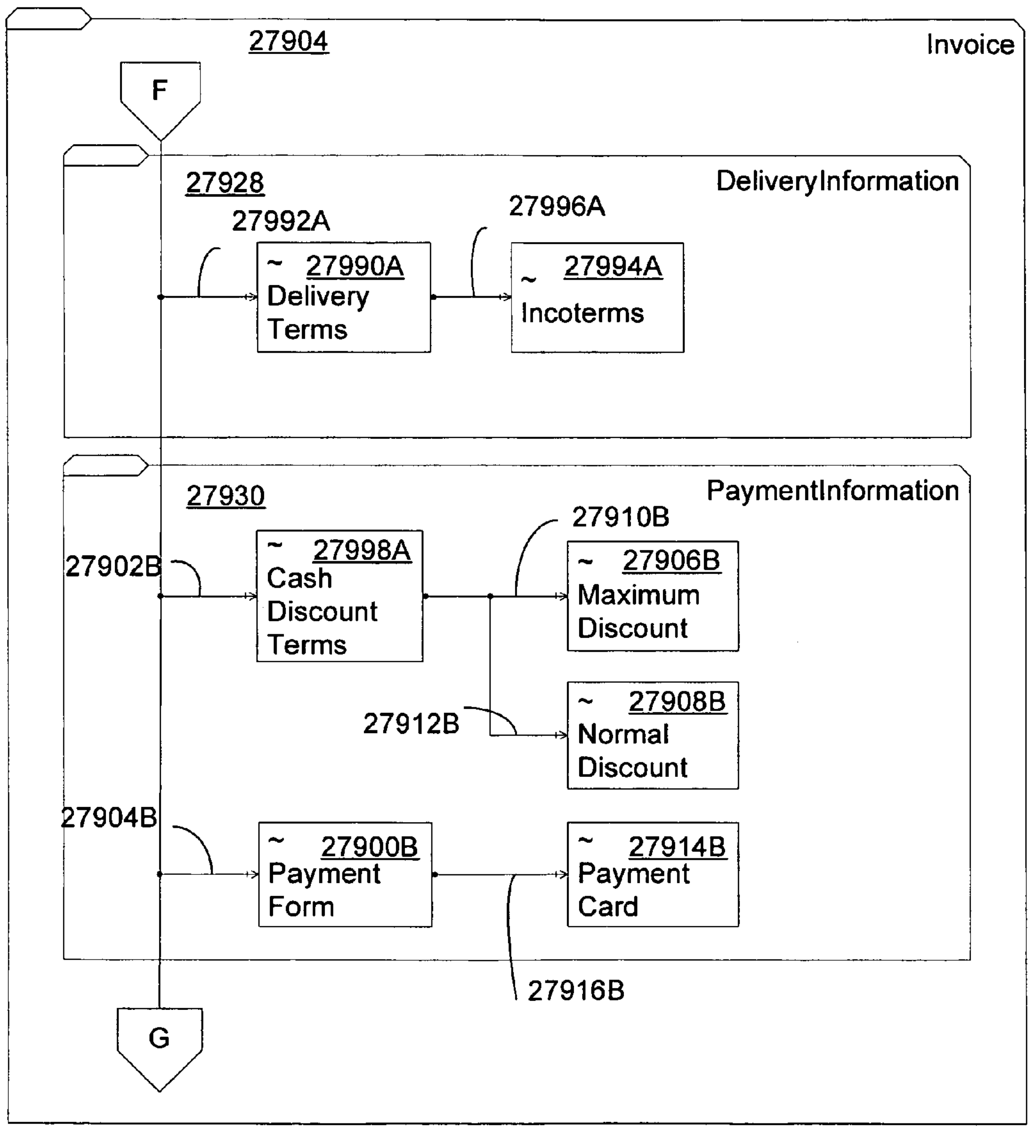
Figure 279G:
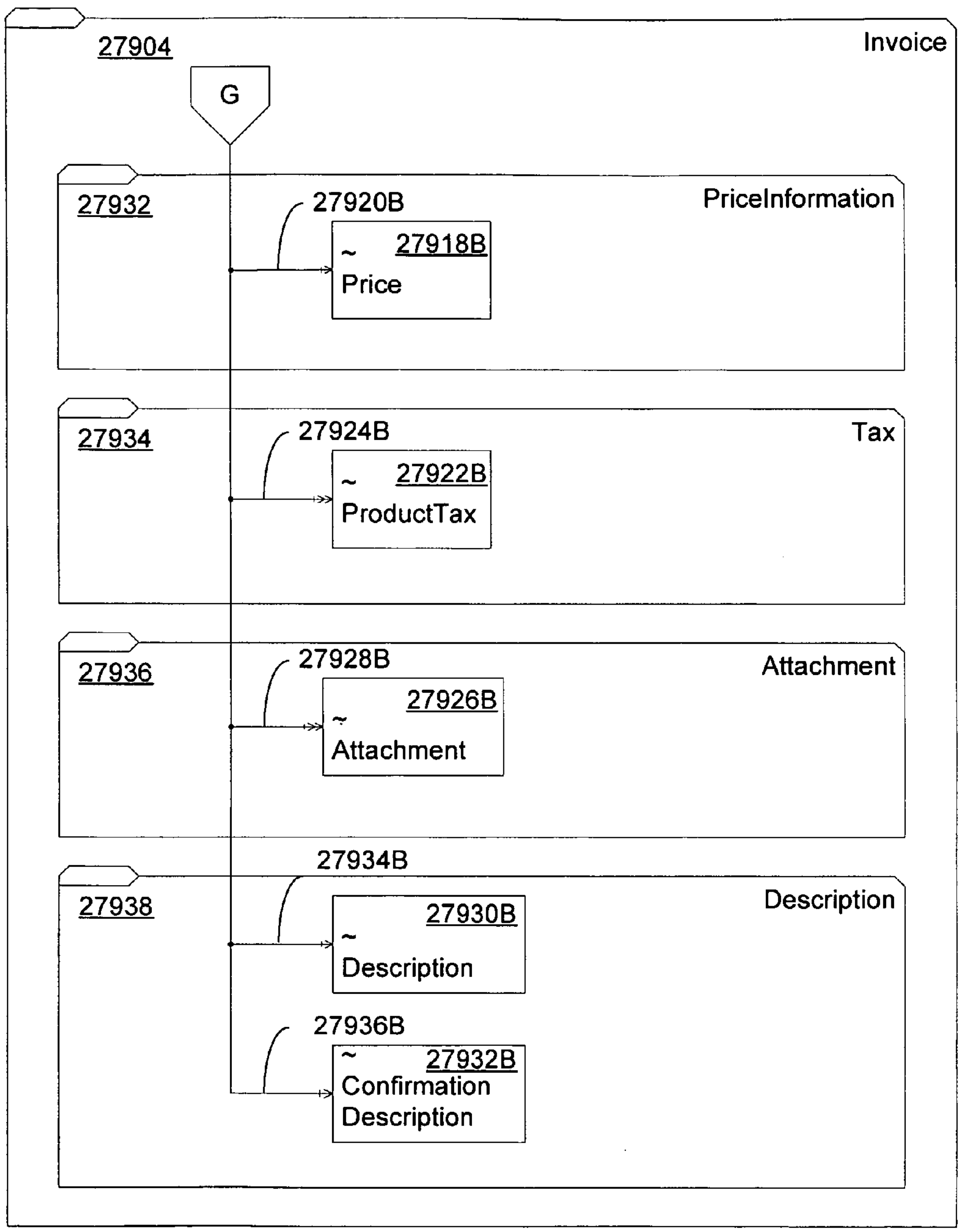
Figure 279H:
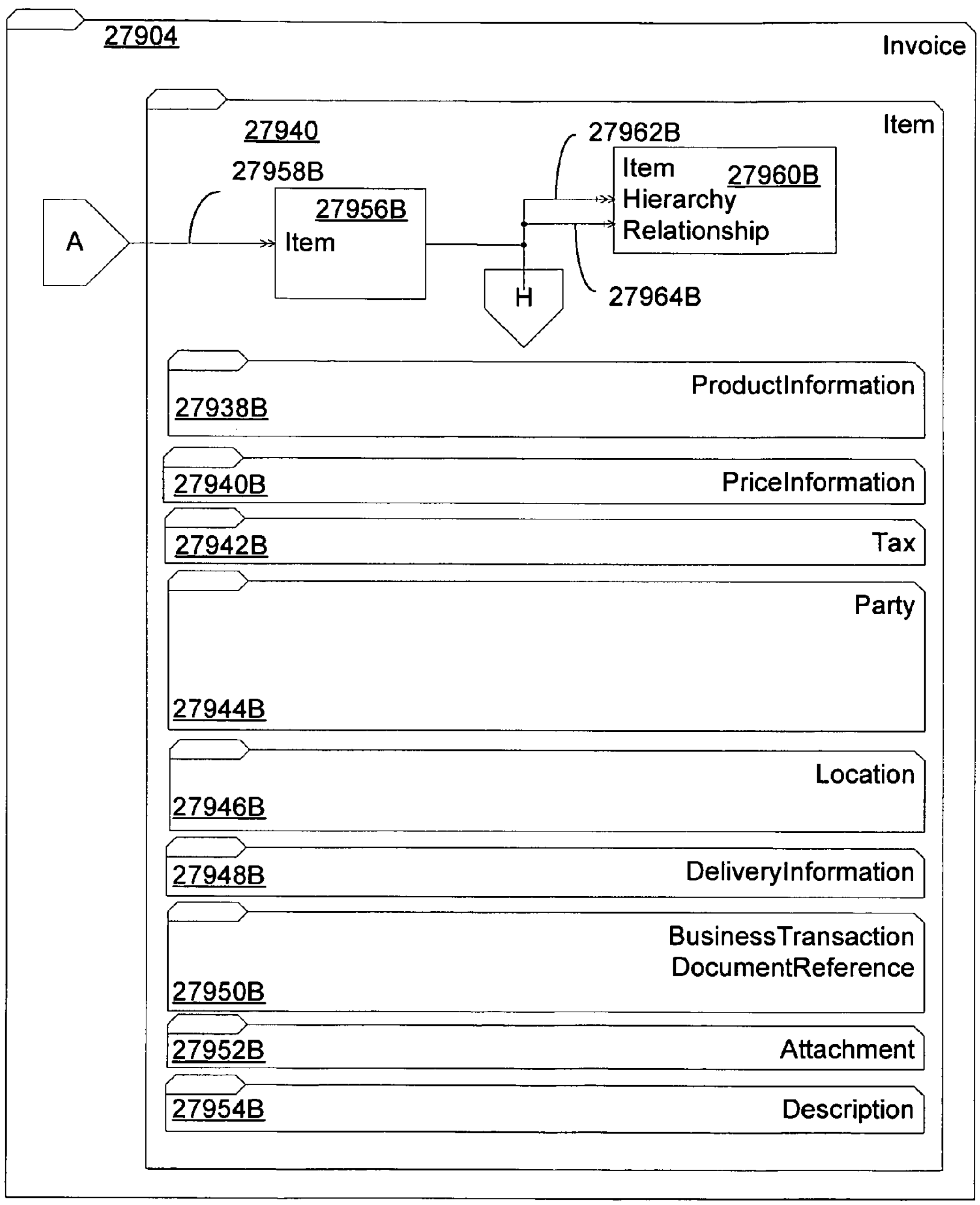
Figure 279I:
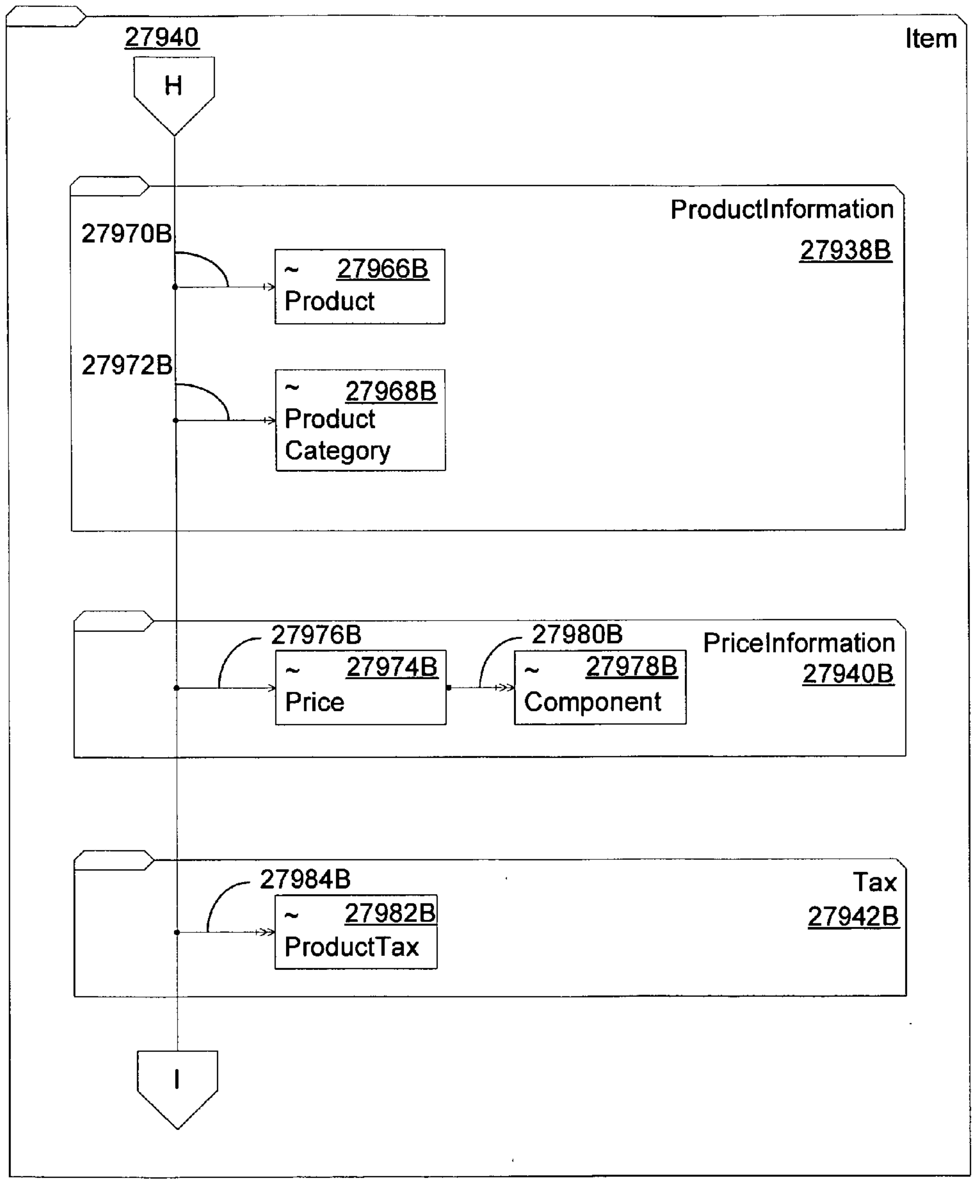
Figure 279J:
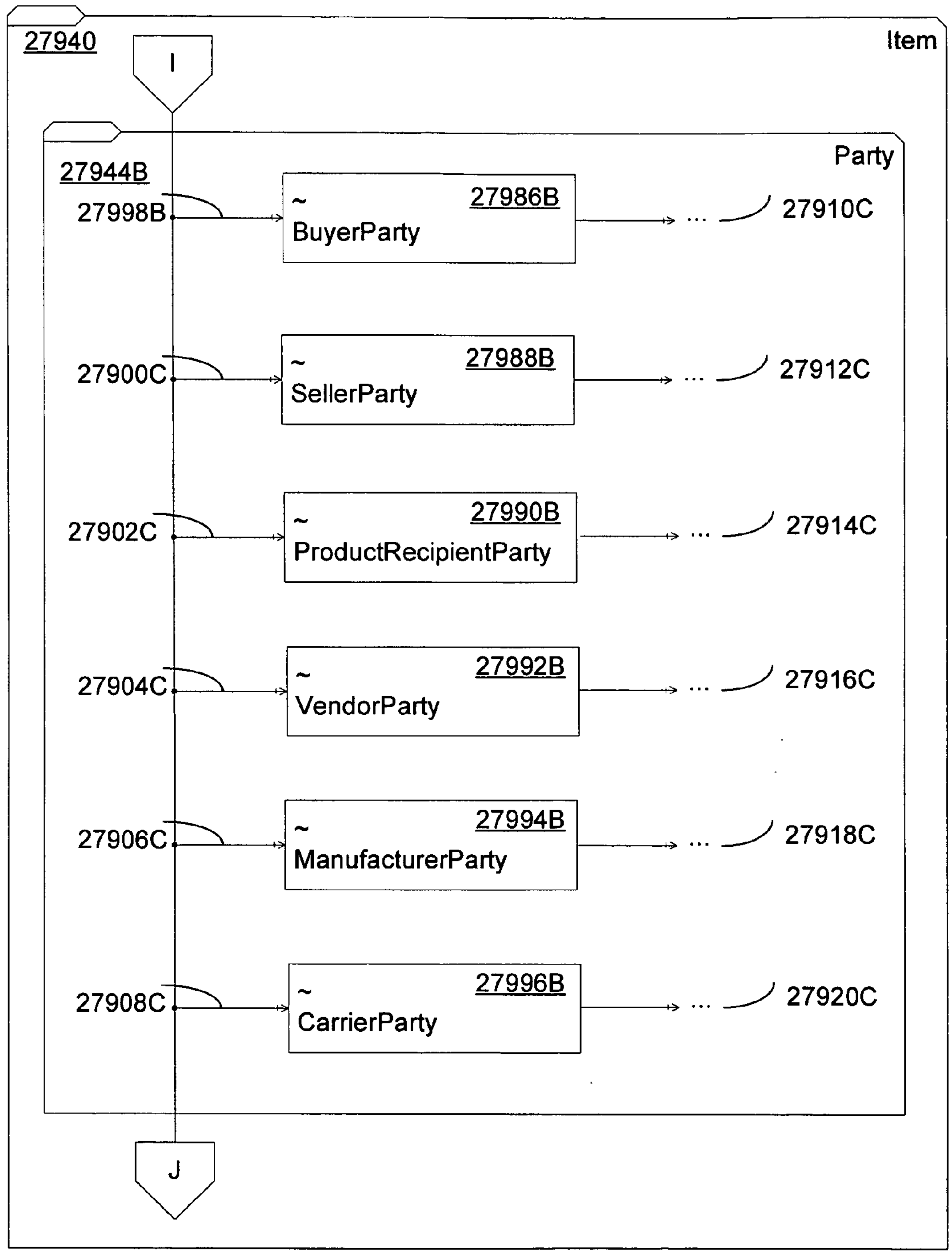
Figure 279K:
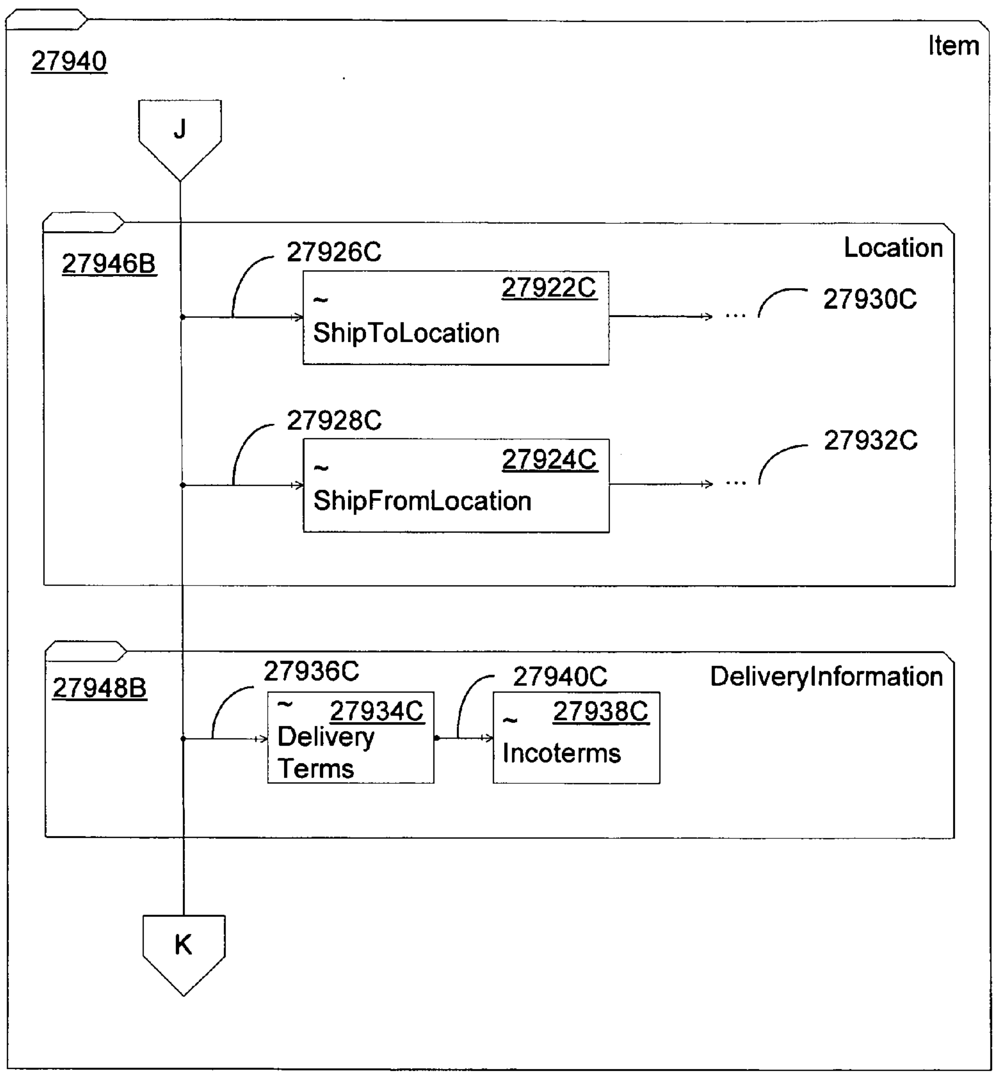
Figure 279L:
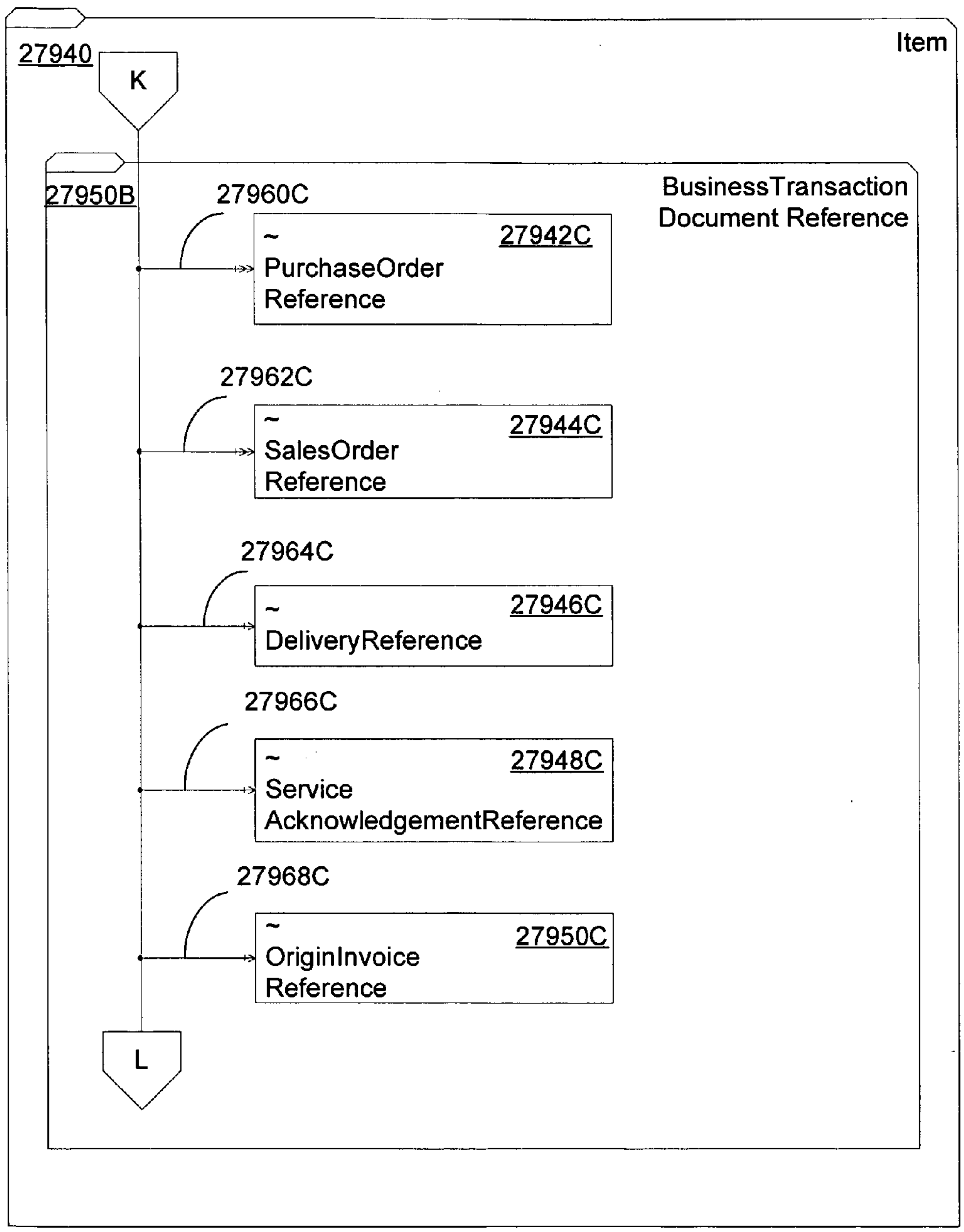
Figure 279M:
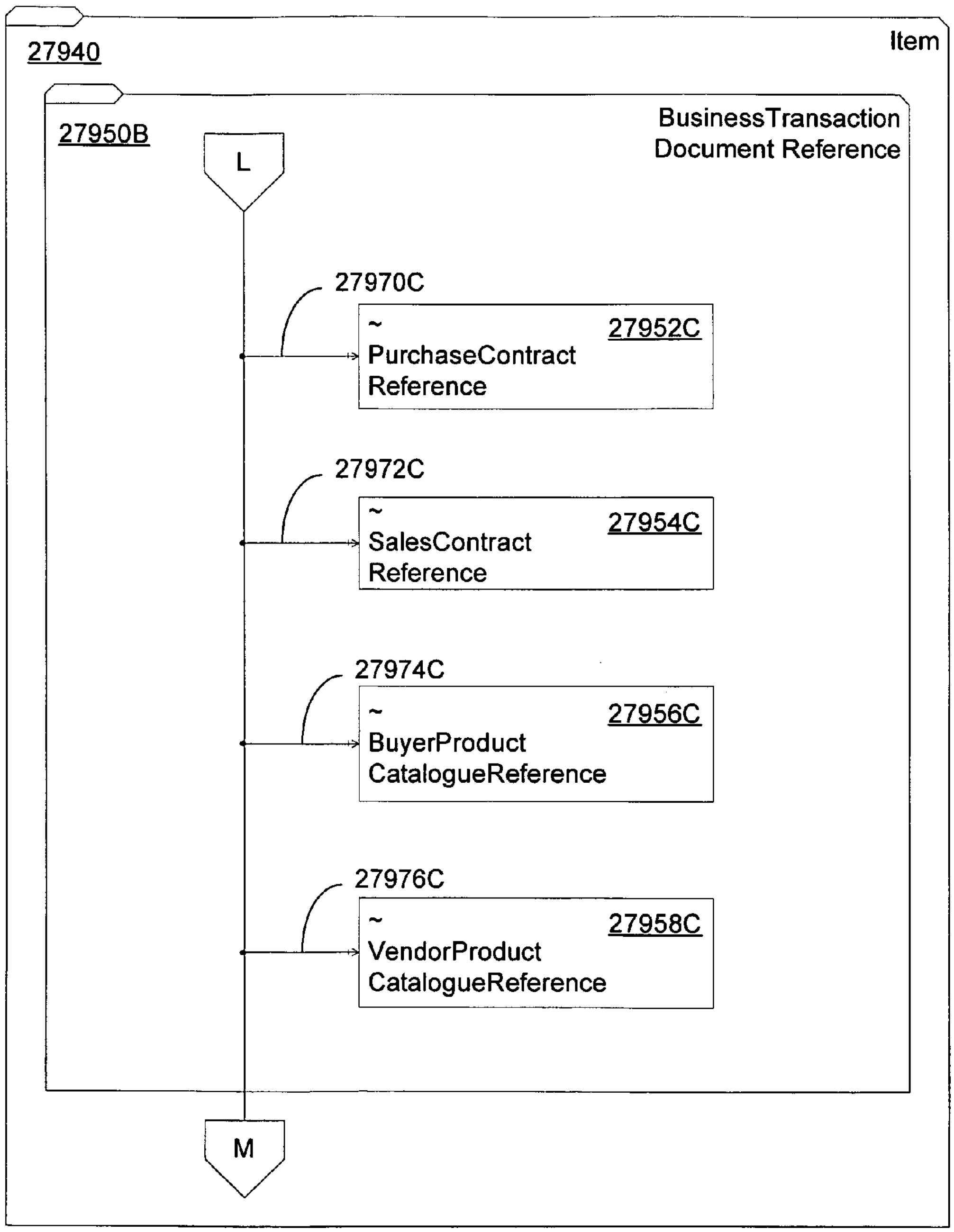
Figure 279N:
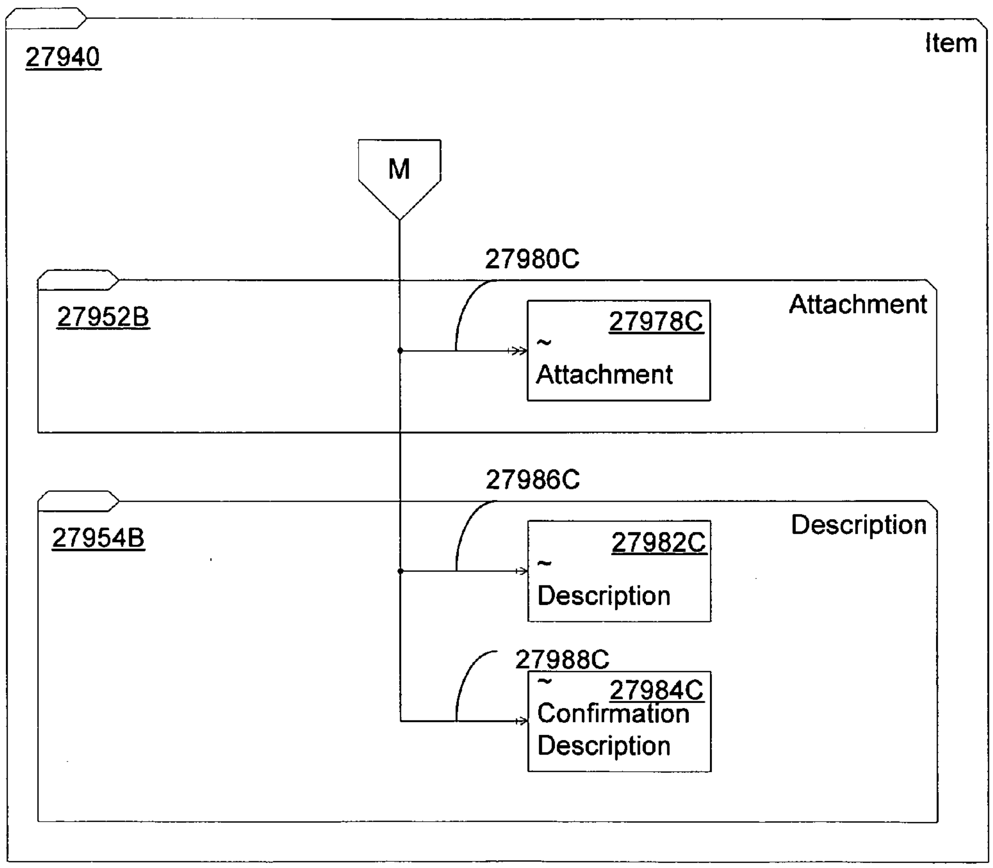
Figure 280K:
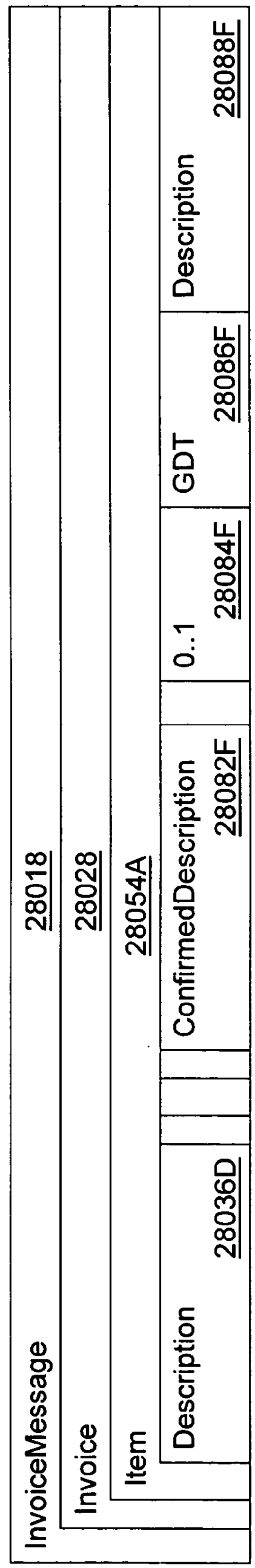

The complete data model for the Invoice Request and Invoice Confirmation is depicted in FIGS. 279A-N. The data model includes an InvoiceMessage package 27900. The InvoiceMessage package 27900 includes a MessageHeader package 27902 and an Invoice package 27904. The InvoiceMessage package 27900 also includes an InvoiceMessage entity 27906. The message data type InvoiceMessage makes the structure available for the message types InvoiceRequest and InvoiceConfirmation, and the relevant interfaces.

A MessageHeader package groups together the business information that is relevant for sending a business document in a message. The MessageHeader package 27902 includes a MessageHeader entity 27908. There is a 1:c relationship 27910 between the InvoiceMessage entity 27906 and the MessageHeader entity 27908.

A MessageHeader entity 27908 groups business information from the perspective of the sending application to identify the business document in a message, to provide information about the sender, and to provide any information about the recipient. The MessageHeader entity 27908 is of type GDT BusinessDocumentMessageHeaderParty. The MessageHeader entity 27908 includes an ID, a ReferenceID, and a CreationDateTime. The ID is the identifier of a business document in a technical message, and is of type GDT BusinessDocumentMessageID. The ReferenceID is the identifier of another instance of a business document in a technical message that the business document references, and is of type GDT BusinessDocumentMessageID. The CreationDateTime is the creation date of a business document in the technical message, and is of type GDT DateTime. The MessageID is set by the sending application.

The MessageHeader entity 27908 also includes a SenderParty entity 27912 and a RecipientParty entity 27914. The SenderParty entity 27912 is the party responsible for sending a business document at the business application level. The SenderParty entity 27912 is of type GDT BusinessDocumentMessageHeaderParty. A RecipientParty entity 27914 is the party responsible for receiving a business document at business application level. The RecipientParty entity 27914 is of type GDT BusinessDocumentMessageHeaderParty. The SenderParty entity 27912 and the RecipientParty 27914 entity include additional information required by the parties 27916, 27918, as discussed in detail below. There is a 1:c relationship 27920 between the MessageHeader entity 27908 and the SenderParty entity 27912A, and a 1:c relationship 27922 between the MessageHeader entity 27908 and the RecipientParty entity 27914.

The Invoice package 27904 is a summary of the invoicing information required for the invoicing process. The Invoice package 27904 includes a Party package 27924, a Location package 27926, a DeliveryInformation package 27928, a PaymentInformation package 27930, a PriceInformation package 27932, a Tax package 27934, an Attachment package 27936, a Description package 27938, and an Item package 27940. The Invoice package 27904 also includes an Invoice entity 27942. There is a 1:1 relationship 27944 between the InvoiceMessage entity 27906 and the Invoice entity 27942.

The Invoice entity 27942 is a binding request from an invoicing party (such as vendor) to an invoice recipient (such as a sold-to-party) to make payment for the type and quantity of products or services received as a result of previous business transactions by a predefined date. The Invoice entity 27942 does not only specify the remuneration and tax to be paid by the participating business partners for products and services provided, but also gives detailed information about the payment conditions and delivery terms.

The Invoice entity 27942 includes an ID, a BillToID, a TypeCode, a DateTime, a CancellationInvoiceIndicator, an AcceptanceStatusCode, and a Note. The ID is the invoice number; a unique identifier that is assigned to the invoice by the invoicing party, and is of type GDT BusinessTransactionDocumentID. The BillToID is a unique identifier that is assigned to the invoice by the invoice recipient, and is of type GDT BusinessTransactionDocumentPartyID. The TypeCode is a coded representation for the invoice type (a specific invoice/payment request, debit memo, or credit memo), and is of type GDT BusinessTransactionDocumentTypeCode. The DateTime is the invoice date, and is of type GDT DateTime. The CancellationInvoiceIndicator is an indicator that specifies whether the invoice is a cancellation invoice or not, and is of type GDT InvoiceCancellationInvoiceIndicator. The AcceptanceStatusCode is a coded representation for the status of the invoice recipient's acceptance of the invoice, and is of type GDT AcceptanceStatusCode. The Note is a short description/name of the invoice, and is of type GDT Note. The Invoice is of type GDT Invoice.

The Party package 27924 groups together the business partners that can be involved in an invoicing process. The Party package 27924 includes a BillToParty entity 27946, a BillFromParty entity 27948, a BuyerParty entity 27950, a SellerParty entity 27952, a ProductRecipientParty entity 27954, a VendorParty entity 27956, a ManufacturerParty entity 27958, a PayerParty entity 27960, a PayeeParty entity 27962, and a CarrierParty entity 27964. There is a 1:1 relationship 27966 between the Invoice entity 27942 and the BillToParty entity 27946. There is a 1:1 relationship 27968 between the Invoice entity 27942 and the BillFromParty entity 27948. There is a 1:c relationship 27970 between the Invoice entity 27942 and the BuyerParty entity 27950. There is a 1:c relationship 27972 between the Invoice entity 27942 and the SellerParty entity 27952. There is a 1:c relationship 27974 between the Invoice entity 27942 and the ProductRecipientParty entity 27954. There is a 1:c relationship 27976 between the Invoice entity 27942 and the VendorParty entity 27956. There is a 1:c relationship 27978 between the Invoice entity 27942 and the ManufacturerParty entity 27958. There is a 1:c relationship 27980 between the Invoice entity 27942 and the PayerParty entity 27960. There is a 1:c relationship

27982 between the Invoice entity 27942 and the PayeeParty entity 27962. There is a 1:c relationship 27984 between the Invoice entity 27942 and the CarrierParty entity 27964.

The BillToParty is the company or person to which/whom the invoice is to be sent for deliveries received or services provided. The BillToParty entity 27946 is of type GDT BusinessTransactionDocumentParty. The BillToParty also can fulfill the functions of the BuyerParty, ProductRecipientParty, and PayerParty. The BillToParty entity 27946 includes an Address entity 27986 and a Contact entity 27988. There is a 1:c relationship 27990 between the BillToParty entity 27946 and the Address entity 27986. There is a 1:c relationship 27992 between the BillToParty entity 27946 and the Contact entity 27988.

The Address entity 27986 includes a PersonName entity 27994, an Office entity 27996, a PhysicalAddress entity 27998, a GeoCoordinates entity 27900A, and a Communication entity 27902A. There is a 1:c relationship 27904A between the Address entity 27986 and the PersonName entity 27994. There is a 1:c relationship 27906A between the Address entity 27986 and the Office entity 27996. There is a 1:c relationship 27908A between the Address entity 27986 and the PhysicalAddress entity 27998. There is a 1:c relationship 27910A between the Address entity 27986 and the GeoCoordinates entity 27900A. There is a 1:c relationship 27912A between the Address entity 27986 and the Communication entity 27902A.

The Contact entity 27988 includes an Address entity 27914A. There is a 1:c relationship 27916A between the Contact entity 27988 and the Address entity 27914A. Similar to the Address entity in the BillToParty entity 27946 discussed above, the Address entity 27914A in the Contact entity 27988 includes a PersonName entity 27918A, an Office entity 27920A, a PhysicalAddress entity 27922A, a GeoCoordinates entity 27924A, and a Communication entity 27926A. There is a 1:c relationship 27928A between the Address entity 27914A and the PersonName entity 27918A. There is a 1:c relationship 27930A between the Address entity 27914A and the Office entity 27920A. There is a 1:c relationship 27932A between the Address entity 27914A and the PhysicalAddress entity 27922A. There is a 1:c relationship 27934A between the Address entity 27914A and the GeoCoordinates entity 27924A. There is a 1:c relationship 27936A between the Address entity 27914A and the Communication entity 27926A.

Each of the BillFromParty entity 27948, the BuyerParty entity 27950, the SellerParty entity 27952, the ProductRecipientParty entity 27954, the VendorParty entity 27956, the ManufacturerParty entity 27958, the PayerParty entity 27960, the PayeeParty entity 27962, and the CarrierParty entity 27964 includes the same elements as that described for the BillToParty entity 27946 as denoted by ellipses 27938A, 27940A, 27942A, 27944A, 27946A, 27948A, 27950A, 27952A, and 27954A.

The BillFromParty is the company or person executing the invoicing process. The BillFromParty entity 27948 is of type GDT BusinessTransactionDocumentParty. The BillFromParty also can fulfill the function of the SellerParty, VendorParty, and PayeeParty.

The BuyerParty is the company or person authorizing the deliveries or services. The BuyerParty entity 27950 is of type GDT BusinessTransactionDocumentParty. If a BuyerParty is not specified explicitly in an invoice, the BillToParty also acts as the BuyerParty.

The SellerParty is the company or person selling (sales/service area). The SellerParty entity 27952 is of type GDT BusinessTransactionDocumentParty. If a SellerParty is not specified explicitly in an invoice, the BillFromParty also acts as the SellerParty.

The ProductRecipientParty is the company or person to which/whom goods are delivered or for which/whom services are provided. The ProductRecipientParty entity 27954 is of type GDT BusinessTransactionDocumentParty. If a ShipToLocation is not specified explicitly in an invoice, the address of the ProductRecipientParty is the delivery address. If a ProductRecipientParty is not specified explicitly in an invoice, the BuyerParty is also the ProductRecipientParty.

The VendorParty is the company or person delivering the goods or providing the service. The VendorParty entity 27956 is of type GDT BusinessTransactionDocumentParty. If a ShipFromLocation is not specified explicitly in an invoice, the address of the VendorParty is the ship-from address. If a VendorParty is not explicitly specified in an invoice, the SellerParty is also the VendorParty. The CarrierParty, not the VendorParty, is the company or person that is solely responsible for transporting the goods.

The ManufacturerParty is the company or person which/who produced the goods being invoiced. The ManufacturerParty entity 27958 is of type GDT BusinessTransactionDocumentParty. The ManufacturerParty can be used for invoice items relating to materials, and can be used to uniquely define the context of a ManufacturerProductID.

The PayerParty is the company or person that pays for the goods or services provided. The PayerParty entity 27960 is of type GDT BusinessTransactionDocumentParty. If a PayerParty is not specified explicitly in an invoice, the BillToParty also acts as the PayerParty.

The PayeeParty is the company or person that receives payment for the goods or services provided. The PayeeParty entity 27962 is of type GDT BusinessTransactionDocumentParty. If a PayeeParty is not specified explicitly in an invoice, the BillFromParty also acts as the PayeeParty.

The CarrierParty is the company or person that transported the goods. The CarrierParty entity 27964 is of type GDT BusinessTransactionDocumentParty. The CarrierParty is to be used for invoice items relating to materials; it can be ignored by the recipient in the case of items relating to services. In certain business transactions involving delivery across countries, the CarrierParty is required for fiscal law purposes.

The Location package 27926 groups together the of the locations that can occur in an invoicing process. The Location package 27926 includes a ShipToLocation entity 27956A and a ShipFromLocation entity 27958A. There is a 1:c relationship 27960A between the Invoice entity 27942 and the ShipToLocation entity 27956A. There is also a 1:c relationship 27962A between the Invoice entity 27942 and the ShipFromLocation entity 27958A.

The invoicing system uses locations that are specified at the Invoice level for the items for which corresponding locations are not explicitly transferred. The invoicing system can use the ShipToLocation entity 27956A and the ShipFromLocation entity 27958A to provide a more detailed description of the flow of goods between the delivery point and the dispatch point. In certain countries, such as the United States, this detailed information is required for calculating taxes.

The ShipToLocation is the location to which goods were delivered or where services were provided. The ShipToLocation entity 27956A is of type GDT BusinessTransactionDocumentLocation. For example, if a BuyerParty headquartered in California orders steel beams for a building located in Arizona, the tax amount is calculated using the tax rates that are valid in Arizona.

The ShipToLocation entity 27956A includes an Address entity 27964A. There is a 1:c relationship 27966A between the ShipToLocation entity 27956A and the Address entity 27964A. The Address entity 27964A includes a PersonName entity 27968A, an Office entity 27970A, a PhysicalAddress entity 27972A, a GeoCoordinates entity 27974A, and a Communication entity 27976A. There is a 1:c relationship 27978A between the Address entity 27964A and the PersonName entity 27968A. There is a 1:c relationship 27980A between the Address entity 27964A and the Office entity 27970A. There is a 1:c relationship 27982A between the Address entity 27964A and the PhysicalAddress entity 27972A. There is a 1:c relationship 27984A between the Address entity 27964A and the GeoCoordinates entity 27974A. There is a 1:c relationship 27986A between the Address entity 27964A and the Communication entity 27976A.

The ShipFromLocation 27958A is the location from which goods were shipped. The ShipFromLocation entity 27958A is of type GDT BusinessTransactionDocumentLocation. The ShipFromLocation entity 27958A includes the same entities 27988A as the ShipToLocation entity 27956A.

The DeliveryInformation package 27928 summarizes the information for a delivery in the invoicing process. The Delivery Information package 27928 includes a DeliveryTerms entity 27990A. There is a 1:c relationship 27992A between the Invoice entity 27942 and the DeliveryTerms entity 27990A. The DeliveryTerms are the conditions and agreements that are valid for executing the delivery and transporting the ordered goods and for the necessary services and activities. The DeliveryTerms entity 27990A is of type GDT DeliveryTerms.

The DeliveryTerms entity 27990A includes an Incoterms entity 27994A. There is a 1:c relationship 27996A between the DeliveryTerms entity 27990A and the Incoterms entity 27994A.

The PaymentInformation package 27930 summarizes the payment information in the invoicing process. The PaymentInformation package 27930 includes a CashDiscountTerms entity 27998A and a PaymentForm entity 27900B. There is a 1:c relationship 27902B between the Invoice entity 27942 and the CashDiscountTerms entity 27998A. There is a 1:c relationship 27904B between the Invoice entity 27942 and the PaymentForm entity 27900B.

The CashDiscountTerms includes the payment conditions (cash discount rates and payment deadlines). The CashDiscountTerms entity 27998A is of type GDT CashDiscountTerms. The CashDiscountTerms entity 27998A includes a MaximumDiscount entity 27906B and a NormalDiscount entity 27908B. There is a 1:c relationship 27910B between the CashDiscountTerms entity 27998A and the MaximumDiscount entity 27906B. There is a 1:c relationship 27912B between the CashDiscountTerms entity 27998A and the NormalDiscount entity 27908B.

The PaymentForm specifies the method of payment for a product. The PaymentForm entity 27900B includes the element PaymentFormCode, which is the coded representation of the payment form and is of type GDT PaymentFormCode. The PaymentForm entity 27900B includes a PaymentCard entity 27914B. There is a 1:c relationship 27916B between the PaymentForm entity 27900B and the PaymentCard entity 27914B.

The PriceInformation package 27932 summarizes the information about the total amount invoiced for the provided products or services, which are listed at item level. The Price is the total amount invoiced for products and services delivered or provided, including the tax and net portions. The Price entity includes a GrossAmount, a NetAmount, and a TaxAmount. The GrossAmount is the gross amount of an invoice (net amount plus tax amount), and is of type GDT Amount. The NetAmount is the net amount of an invoice, and is of type GDT Amount. The TaxAmount is the tax amount of an invoice, and is of type GDT Amount. The PriceInformation package 27932 includes a Price entity 27918B. There is a 1:c relationship 27920B between the Invoice entity 27942 and the Price entity 27918B.

The Tax package 27934 summarizes the information about the tax price components in the total amount invoiced for products delivered or services provided. The Tax package 27934 includes a ProductTax entity 27922B. There is a 1:cn relationship 27924B between the Invoice entity 27942 and the ProductTax entity 27922B. The ProductTax is the tax amount invoiced for products or services delivered or provided, cumulated for the invoice items. The ProductTax entity 27922B is of type GDT ProductTax.

The Attachment package 27936 groups together the attachment information relating to the invoice. The Attachment package 27936 includes an Attachment entity 27926B. There is a 1:cn relationship 27928B between the Invoice entity 27942 and the Attachment entity 27926B. The Attachment entity 27926B is a document of any type that relates to the invoice and is transferred with it, and is of type GDT Attachment.

The Description package 27938 groups together the explanatory texts relating to an invoice. The Description package 27938 includes a Description entity 27930B and a ConfirmationDescription entity 27932B. There is a 1:c relationship 27934B between the Invoice entity 27942 and the Description entity 27930B, and a 1:c relationship 27936B between the Invoice entity 27942 and the ConfirmationDescription entity 27932B. The Description is a natural language text relating to the invoice, which is visible to business parties. The Description entity 27930B is of type GDT Description. The Description can be used for the textual information relating to the invoice transferred. An example of this would be information stating that the Sales employee responsible is on vacation as of a specific date and indicating the name and telephone number of a substitute as of this date.

The ConfirmationDescription is a natural language text relating to the invoice confirmation, which is visible to business parties. The ConfirmationDescription entity 27932B is of type GDT Description. The invoicing system does not use ConfirmationDescription in an InvoiceRequest. The invoicing system can use the ConfirmationDescription for the textual information relating to the invoice confirmation. An example of this would be the invoice recipient's justification for rejecting a particular invoice.

The InvoiceItem package ("Item package") 27940 groups together the information about the amounts invoiced or credited for products, broken down according to the type and scope of the goods delivered or the services provided. The Item package 27940 includes a ProductInformation package 27938B, a PriceInformation package 27940B, a Tax package 27942B, a Party package 27944B, a Location package 27946B, a DeliveryInformation package 27948B, a BusinessTransactionDocumentReference package 27950B, an Attachment package 27952B, and a Description package 27954B. The Item package 27940 also includes an Item entity 27956B. There is a 1:n relationship 27958B between the Invoice entity 27942 and the Item entity 27956B. InvoiceItems 27956B are arranged hierarchically using a HierarchyRelationship 27960B. The HierarchyRelationship 27960B is the relationship between a sub-item and a higher-level parent item in an item hierarchy. There is a 1:cn relationship 27962B between the Item entity 27956B and its subordinate entities. There is a 1:c relationship 27964B between the Item entity 27956B and its superordinate entities. HierarchyRelationship includes a ParentItemID, a ParentItemBillToID, and a TypeCode. The ParentItemID is the reference to a parent item with the item number assigned by the invoicing party. InvoiceItemHierarchyRelationshipParentItemID is of type GDT BusinessTransactionDocumentItemID. The ParentItemBillToID is the reference to a parent item with the item number assigned by the invoice recipient. InvoiceItemHierarchyRelationshipParentItemID is of type GDT BusinessTransactionDocumentItemID. The TypeCode is a coded representation of the hierarchical relationship between the sub-item and its higher-level parent item. InvoiceItemHierarchyRelationshipTypeCode is of type GDT BusinessTransactionDocumentItemHierarchyRelationshipTypeCode.

The InvoiceItem is part of an invoice containing the prices and taxes for the quantity of a product that has been delivered or for a service that has been provided. In addition, to the information about prices and taxes, the InvoiceItem includes information about the participating business partners, the payment conditions, and the delivery terms, if they differ from the information provided in the invoice header.

The InvoiceItem entity 27956B includes an ID, a BillToID, a TypeCode, a DeliveryPeriod, and a Quantity. The ID is an invoice item number; a unique identifier that is assigned to the invoice item by the invoicing party, and is of type GDT BusinessTransactionDocumentItemID. The BillToID is a unique identifier that is assigned to the invoice item by the invoice recipient, and is of type GDT BusinessTransactionDocumentItemPartyID. The TypeCode is a coded representation for the invoice item type (a specific invoice item, credit memo item, or shipping costs item), and is of type GDT BusinessTransactionDocumentItemTypeCode. The DeliveryPeriod is the delivery date of the products invoiced or the time period in which the service was provided, and is of type GDT DateTimePeriod. The Quantity is the quantity invoiced, and is of type GDT Quantity.

The InvoiceItemProductInformation package ("ProductInformation package") 27938B summarizes the information for identifying, describing, and classifying a product in an invoice item. The ProductInformation package 27938B includes a Product entity 27966B and a ProductCategory entity 27968B. There is a 1:c relationship 27970B between the Item entity 27956B and the Product entity 27966B. There is a 1:c relationship 27972B between the Item entity 27956B and the ProductCategory entity 27968B.

The Product identifies, describes, and classifies the product that has been invoiced. The Product entity 27966B is of type GDT BusinessTransactionDocumentProduct. With the exception of grouping hierarchy items, at least either the product number or product description (note) is specified when a new item is created. If both the product number and description are specified, the description is merely additional information in the message and can be ignored by the recipient.

The ProductCategory is the assignment of an invoiced product to a higher-level, business-specific category. The ProductCategory entity 27968B is of type GDT BusinessTransactionDocumentProductCategory. The product category is derived directly from the product if a product number is specified for the product. It can differ for the buyer and seller if they have classified the same product differently. This is allowed and should be tolerated by the systems involved.

The InvoiceItemPriceInformation package ("PriceInformation package") 27940B summarizes the information about the amount invoiced for a product delivered or a service provided, including the price components. The PriceInformation package 27940B includes a Price entity 27974B. There is a 1:1 relationship 27976B between the Item entity 27956B and the Price entity 27974B. The Price is the amount invoiced for a delivered product or a service provided, including the tax and net portions. The Price includes a GrossAmount, a NetAmount, a TaxAmount, a NetUnitPrice, an ExchangeRate, and a PricingDate. The GrossAmount is the gross amount of an item (net amount plus tax amount), and is of the type GDT Amount. The NetAmount is the net amount of an item, and is of the type GDT Amount. The TaxAmount is the tax amount of an item, and is of the type GDT Amount. The NetUnitPrice is the net price for the base quantity of a product and that was used to calculate the net amount. For example: € 10 for 5 pieces. The NetUnitPrice is of the type GDT Price. The ExchangeRate is information about the exchange rate, and is of the type GDT ExchangeRate. The PricingDate is the date on which the price is calculated, and is of the type GDT Date.

The Price entity 27974B also includes a Component entity 27978B. There is a 1:cn relationship 27980B between the Price entity 27974B and the Component entity 27978B. The invoicing system specifies the elements NetAmount and GrossAmount if the invoice item specified is not a grouping hierarchy item.

The Component is a non-fiscal part of a price in an invoice item. The Component entity 27978B is of type GDT PriceComponent. An invoice item can contain several price components. A detailed list of the price components (including, for instance, rounding difference clearing) is provided to help the invoice recipient understand the composition of the amount invoiced. In B2B standards, such as RosettaNet (PIP 3C3 version 1.1) or xCBL 3.0, price components are not available in this form. As a result, the usual elements in B2B standards, namely, GrossAmount and NetAmount, are stressed explicitly and are shown redundantly alongside the detailed list that includes price components. Taxes also are price components that are shown explicitly because of legal aspects. Tax information (ProductTax) is not shown redundantly. The Price entity includes a Component entity. There is a 1:cn relationship between the Price entity and the Component entity.

The InvoiceItemTax package ("Tax package") 27942B summarizes the information about the tax price components in the total amount invoiced for delivered products or services provided. The Tax package 27942B includes a ProductTax entity 27982B. There is a 1:cn relationship 27984B between the Item entity 27956B and the ProductTax entity 27982B. The ProductTax is a tax price component of an invoice item that is incurred for each tax type and rate. The ProductTax entity 27982B is of type GDT ProductTax.

The InvoiceItemParty package ("Party package") 27944B groups together the business partners that can be involved in an invoice item. These parties are different from the partners specified at the Invoice level. The Party package 27944B in the Item package 27940 includes a BuyerParty entity 27986B, a SellerParty entity 27988B, a ProductRecipientParty entity 27990B, a VendorParty entity 27992B, a ManufacturerParty entity 27994B, and a CarrierParty entity 27996B. There is a 1:c relationship 27998B between the Item entity 27956B and the BuyerParty entity 27986B. There is a 1:c relationship 27900C between the Item entity 27956B and the SellerParty entity 27988B. There is a 1:c relationship 27902C between the Item entity 27956B and the ProductRecipientParty entity 27990B. There is a 1:c relationship 27904C between the Item entity 27956B and the VendorParty entity 27992B. There is a 1:c relationship 27906C between the Item entity 27956B and the ManufacturerParty entity 27994B. There is a 1:c relationship 27908C between the Item entity 27956B and the CarrierParty entity 27996B. Each of these parties includes the same elements as those described for the BillToParty entity 27946 as denoted by ellipses 27910C, 27912C, 27914C, 27916C, 27918C, 27920C.

The Location package 27946B in the Item package 27940 includes a ShipToLocation entity 27922C and a ShipFromLocation entity 27924C. There is a 1:c relationship 27926C between the Item entity 27956B and the ShipToLocation entity 27922C. There is a 1:c relationship 27928C between the Item entity 27956B and the ShipFromLocation entity 27924C. The ShipToLocation entity 27922C and the ShipFromLocation entity 27924C include the same elements as those described for the ShipToLocation entity 27956A as denoted by ellipses 27930C, 27932C.

The DeliveryInformation package 27948B in the Item package 27940 includes a DeliveryTerms entity 27934C. There is a 1:c relationship 27936C between the Item entity 27956B and the DeliveryTerms entity 27934C. The DeliveryTerms entity 27934C includes an Incoterms entity 27938C. There is a 1:c relationship 27940C between the DeliveryTerms entity 27934C and the Incoterms entity 27938C.

The InvoiceItemBusinessTransactionDocumentReference package ("BusinessTransactionDocumentReference package") 27950B groups together the references to business documents that can be required in the invoicing process at item level. The BusinessTransactionDocumentReference package 27950B in the Item package 27940 includes a PurchaseOrderReference entity 27942C, a SalesOrderReference entity 27944C, a DeliveryReference entity 27946C, a ServiceAcknowledgementReference entity 27948C, an OriginInvoiceReference entity 27950C, a PurchaseContractReference entity 27952C, a SalesContractReference entity 27954C, a BuyerProductCatalogueReference entity 27956C, and a VendorProductCatalogueReference entity 27958C. There is a 1:cn relationship 27960C between the Item entity 27956B and the PurchaseOrderReference entity 27942C. There is a 1:cn relationship 27962C between the Item entity 27956B and the SalesOrderReference entity 27944C. There is a 1:c relationship 27964C between the Item entity 27956B and the DeliveryReference entity 27946C. There is a 1:c relationship 27966C between the Item entity 27956B and the ServiceAcknowledgementReference entity 27948C. There is a 1:c relationship 27968C between the Item entity 27956B and the OriginInvoiceReference entity 27950C. There is a 1:c relationship 27970C between the Item entity 27956B and the PurchaseContractReference entity 27952C. There is a 1:c relationship 27972C between the Item entity 27956B and the SalesContractReference entity 27954C. There is a 1:c relationship 27974C between the Item entity 27956B and the BuyerProductCatalogueReference entity 27956C. There is a 1:c relationship 27976C between the Item entity 27956B and the VendorProductCatalogueReference entity 27958C.

The PurchaseOrderReference is the reference to a purchase order or an item within a purchase order. The PurchaseOrderReference entity 27942C is of type GDT BusinessTransactionDocumentReference. The PurchaseOrderReference includes the purchase order number and purchase order item number assigned by the buyer. There can be more than one PurchaseOrderReference.

The SalesOrderReference is the reference to an order or an item within an order. The SalesOrderReference entity 27944C is of type GDT BusinessTransactionDocumentReference. The SalesOrderReference includes the order number and order item number assigned by the seller. There can be more than one SalesOrderReference.

The DeliveryReference is the reference to a delivery. The DeliveryReference entity 27946C is of type GDT BusinessTransactionDocumentReference. The DeliveryReference includes the delivery note number assigned by the seller.

The ServiceAcknowledgementReference is the reference to a confirmation that a service has been provided, which was created by the seller (for example, in the service entry system). The ServiceAcknowledgementReference entity 27948C is of type GDT BusinessTransactionDocumentReference. ServiceAcknowledgementReference includes the service acknowledgment number assigned by the service provider.

The OriginInvoiceReference is the reference to an invoice previously sent. The OriginInvoiceReference entity 27950C is of type GDT BusinessTransactionDocumentReference. An OriginInvoiceReference includes the invoice number assigned by the invoicing party. This reference is required if a credit memo is issued for an amount that has been invoiced.

The PurchaseContractReference is the reference to a purchase contract or an item within a purchase contract. The PurchaseContractReference entity 27952C is of type GDT BusinessTransactionDocumentReference. Provided it has not been agreed otherwise, the seller is responsible for determining the correct SalesContractReference for a specified PurchaseContractReference.

The SalesContractReference is the reference to a sales contract or an item within a sales contract. The SalesContractReference entity 27954C is of type GDT BusinessTransactionDocumentReference.

The BuyerProductCatalogueReference is the reference to a buyer's product Catalogue or an item within such a catalogue. The BuyerProductCatalogueReference entity 27956C is of type GDT CatalogueReference. The BuyerProductCatalogueReference is filled if an invoice item refers to a Catalogue whose number and item numbers were assigned by the buyer.

The VendorProductCatalogueReference is the reference to a seller's product Catalogue or an item within such a catalogue. The VendorProductCatalogueReference entity 27958C is of type GDT CatalogueReference. The invoicing system always fills VendorProductCatalogueReference if an invoice item refers to a Catalogue whose number and item numbers were assigned by the seller.

The Attachment package 27952B in the Item package 27940 includes an Attachment entity 27978C. There is a 1:cn relationship 27980C between the Item entity 27956B and the Attachment entity 27978C.

The Description package 27954B in the Item package 27940 includes a Description entity 27982C and a ConfirmationDescription entity 27984C. There is a 1:c relationship 27986C between the Item entity 27956B and the Description entity 27982C and a 1:c relationship 27988C between the Item entity 27956B and the ConfirmationDescription entity 27984C.

FIGS. 280A-K depict the element structure for the Invoice interfaces. The element structure is similar to the data model, but provides additional information regarding the details of the interface. The element structure identifies the different packages 28000 in the interface, and represents the entities at various levels within the interface. As depicted in FIGS. 280A-K, the Interface interfaces include five levels 28002, 28004, 28006, 28008, 28010. The element structure identifies the cardinality or occurrence 28012 between the entities and/or attributes of the interface, and provides information (i.e., type 28014 and name 28016) regarding the data type that provides the basis for the entity and/or attribute. The outermost package of this interface is an InvoiceMessage package 28018, which includes an InvoiceMessage entity 28020 at the first level 28002. The InvoiceMessage entity 28020 is of type message data type ("MDT") 28022 "InvoiceMessage" 28024.

The InvoiceMessage package 28018 includes a MessageHeader package 28026 and an Invoice package 28028. The MessageHeader package 28026 includes a MessageHeader entity 28030, which is of type generic data type ("GDT") 28034 "MessageHeader" 28036. There is one or zero 28032 MessageHeader entity 28030 for each InvoiceMessage entity 28020.

The MessageHeader entity 28030 includes a MessageID 28038, a ReferenceMessageID 28046, and a CreationDateTime 28054. The MessageID 28038 is of type GDT 28042 MessageID 28044. The ReferenceMessageID 28046 is of type GDT 28050 MessageID 28052. The CreationDateTime 28054 is of type GDT 28058 DateTime 28060. There is one 28040 MessageID 28038 for each MessageHeader entity 28030, one or zero 28048 ReferenceMessageID 28046 for each MessageHeader entity 28030, and one 28056 CreationDateTime 28054 for each MessageHeader entity 28030.

The MessageHeader entity 28030 also includes a SenderParty entity 28062 and a RecipientParty entity 28070. The SenderParty entity 28062 is of type GDT 28066 BusinessDocumentMessageHeaderParty 28068. The RecipientParty entity 28070 is also of type GDT 28074 BusinessDocumentMessageHeaderParty 28076. There is one or zero 28064 SenderParty entity 28062 for each MessageHeader entity 28030, and there is one or zero 28072 RecipientParty entity 28070 for each MessageHeader entity 28030.

The Invoice package 28028 includes an Invoice entity 28078. The Invoice entity 28078 is of type GDT 28080 Invoice 28081. There is one 28079 Invoice entity 28078 for each InvoiceMessage entity 28020. The Invoice entity 28078 includes an ID 28082, a BillToID 28090, a TypeCode 28098, a DateTime 28006A, a CancellationInvoiceIndicator 28014A, an AcceptanceStatusCode 28022A, and a Note 28030A. The ID 28082 is of type GDT 28086 BusinessTransactionDocumentID 28088. The BillToID 28090 is of type GDT 28094 BusinessTransactionDocumentID 28096. The TypeCode 28098 is of type GDT 28002A BusinessTransactionDocumentTypeCode 28004A. The DateTime 28006A is of type GDT 28010A DateTime 28012A. The CancellationInvoiceIndicator 28014A is of type GDT 28018A InvoiceCancellationInvoiceIndicator 28020A. The AcceptanceStatusCode 28022A is of type GDT 28026A AcceptanceStatusCode 28028A. The Note 28030A is of type GDT 28034A Note 28036A. There is one 28084 ID 28082 for each Invoice entity 28078. There is one or zero 28092 BillToID 28090 for each Invoice entity 28078. There is one 28000A TypeCode 28098 for each Invoice entity 28078. There is one 28008A DateTime 28006A for each Invoice entity 28078. There is one or zero 28016A CancellationInvoiceIndicator 28014A for each Invoice entity 28078. There is one or zero 28024A AcceptanceStatusCode 28022A for each Invoice entity 28078. There is one or zero 28032A Note 28030A for each Invoice entity 28078.

The Party package 28038A includes a BillToParty entity 28056A, a BillFromParty entity 28064A, a BuyerParty entity 28072A, a SellerParty entity 28080A, a ProductRecipientParty entity 28088A, a VendorParty entity 28096A, a ManufacturerParty entity 28004B, a PayerParty entity 28012B, a PayeeParty entity 28020B, and a CarrierParty entity 28028B. The BillToParty entity 28056A is of type GDT 28060A BusinessTransactionDocumentParty 28062A. There is one 28058A BillToParty entity 28056A for each Invoice entity 28078. The BillFromParty entity 28064A is of type GDT 28068A BusinessTransactionDocumentParty 28070A. There is one 28066A BillFromParty entity 28064A for each Invoice entity 28078. The BuyerParty entity 28072A is of type GDT 28076A BusinessTransactionDocumentParty 28078A. There is one or zero 28074A BuyerParty entity 28072A for each Invoice entity 28078. The SellerParty entity 28080A is of type GDT 28084A BusinessTransactionDocumentParty 28086A. There is one or zero 28082A SellerParty entity 28080A for each Invoice entity 28078. The ProductRecipientParty entity 28088A is of type GDT 28092A BusinessTransactionDocumentParty 28094A. There is one or zero 28090A ProductRecipientParty entity 28088A for each Invoice entity 28078. The VendorParty entity 28096A is of type GDT 28000B BusinessTransactionDocumentParty 28002B. There is one or zero 28098A VendorParty entity 28096A for each Invoice entity 28078. The ManufacturerParty entity 28004B is of type GDT 28008B BusinessTransactionDocumentParty 28010B. There is one or zero 28006B ManufacturerParty entity 28004B for each Invoice entity 28078. The PayerParty entity 28012B is of type GDT 28016B BusinessTransactionDocumentParty 28018B. There is one or zero 28014B PayerParty entity 28012B for each Invoice entity 28078. The PayeeParty entity 28020B is of type GDT 28024B BusinessTransactionDocumentParty 28026B. There is one or zero 28022B PayeeParty entity 28020B for each Invoice entity 28078. The CarrierParty entity 28028B is of type GDT 28032B BusinessTransactionDocumentParty 28034B. There is one or zero 28030B CarrierParty entity 28028B for each Invoice entity 28078.

The Location package 28040A includes a ShipToLocation entity 28036B and a ShipFromLocation entity 28044B. The ShipToLocation entity 28036B is of type GDT 28040B BusinessTransactionDocumentLocation 28042B. There is one or zero 28038B ShipToLocation entity 28036B for each Invoice entity 28078. The ShipFromLocation entity 28044B is of type GDT 28048B BusinessTransactionDocumentLocation 28050B. There is one or zero 28046B ShipFromLocation entity 28044B for each Invoice entity 28078.

The DeliveryInformation package 28042A includes a DeliveryTerms entity 28052B, which is of type GDT 28056B DeliveryTerms 28058B. There is one or zero 28054B DeliveryTerms entity 28052B for each Invoice entity 28078.

The PaymentInformation package 28044A includes a CashDiscountTerms entity 28060B, which is of type GDT 28064B CashDiscountTerms 28066B. There is one or zero 28062B CashDiscountTerms entity 28060B for each Invoice entity 28078. The PaymentInformation package 28044A also includes a PaymentForm entity 28068B, which if of type GDT 28071B PaymentForm 28072B. There is one or zero 28070B PaymentForm entity 28068B for each Invoice entity 28078.

The PriceInformation package 28046A includes a Price entity 28088B. There is one 28090B Price entity 28088B for each Invoice entity 28078. The Price entity 28088B includes a GrossAmount 28092B, a NetAmount 28000C, a TaxAmount 28008C and an ExchangeRate 28016C. The GrossAmount 28092B is of type GDT 28096B Amount 28098B. There is one 28094B GrossAmount 28092B for each Price entity 28088B. The NetAmount 28000C is of type GDT 28004C Amount 28006C. There is one or zero 28002C NetAmount 28000C for each Price entity 28088B. The TaxAmount 28008C is of type GDT 28012C Amount 28014C. There is one or zero 28010C TaxAmount 28008C for each Price entity 28088B. The ExchangeRate 28016C is of type GDT 28020C ExchangeRate 28022C. There is one or zero 28018C ExchangeRate 28016C for each Price entity 28088B.

The Tax package 28048A includes a ProductTax entity 28024C, which is of type GDT 28028C ProductTax 28030C. There are any number 28026C of ProductTax entities 28024C for each Invoice entity 28078.

The Attachment package 28050A includes an Attachment entity 28032C, which is of type GDT 28036C Attachment 28038C. There are any number 28034C of Attachment entities 28032C for each Invoice entity 28078.

The Description package 28052A includes a Description entity 28040C and a ConfirmedDescription entity 28048C. The Description entity 28040C is of type GDT 28044C Description 28046C. There is one or zero 28042C Description entity 28040C for each Invoice entity 28078. The ConfirmedDescription entity 28048C is of type GDT 28052C Description 28054C. There is one or zero 28050C ConfirmedDescription entity 28048C for each Invoice entity 28078.

The Item package 28054A includes an Item entity 28056C, which is of type GDT 28058C InvoiceItem 28059C. There is one or more 28057C Item entities 28056C for each Invoice entity 28078. The Item entity 28056C includes an ID 28060C, a BillToID 28068C, a TypeCode 28076C, a Quantity 28084C, a HierarchyRelationship 28092C, and a DeliveryPeriod 28012D. The ID 28060C is of type GDT 28064C BusinessTransactionDocumentItemID 28066C, and there is one 28062C ID 28060C for each Item entity 28056C. The BillToID 28068C is of type GDT 28072C BusinessTransactionDocumentItemPartyID 28074C, and there is one or zero 28070C BillToID 28068C for each Item entity 28056C. The TypeCode 28076C is of type GDT 28080C BusinessTransactionDocumentItemTypeCode 28082C, and there is one 28078C TypeCode 28076C for each Item entity 28056C. The Quantity 28084C is of type GDT 28088C Quantity 28090C, and there is one or zero 28086C Quantity 28090C for each Item entity 28056C. There is one or zero 28094C HierarchyRelationship 28092C for each Item entity 28056C. The HierarchyRelationship 28092C includes a ParentItemID 28096C, which is of type GDT 28000D BusinessTransactionDocumentItemID 28002C, and a TypeCode 28004D, which is of type CDT 28008D ItemHierarchyRelationshipTypeCode 28010D. There is one 28098C ParentItemID 28096C for each HierarchyRelationship 28092C, and there is one 28006D TypeCode 28004D for each HierarchyRelationship 28092C. The DeliveryPeriod entity 28012D is of type GDT 28016D DateTimePeriod 28018D, and there is one or zero 28014D DeliveryPeriod entity 28012D for each Item entity 28056C. The Item package 28054A also includes a ProductInformation package 28020D, a PriceInformation package 28022D, a Tax package 28024D, a Party package 28026D, a Location package 28028D, a DeliveryInformation package 28030D, a BusinessTransactionDocumentReference package 28032D, an Attachment package 28034D and a Description package 28036D.

The ProductInformation package 28020D includes a Product entity 28038D and a Product Category entity 28046D. The Product entity 28038D is of type GDT 28042D Product 28044D. There is one or zero 28040D Product entity 28038D for each Item entity 28056C. The ProductCategory entity 28046D is of type GDT 28050D ProductCategory 28052D. There is one or zero 28048D ProductCategory entity 28046D for each Item entity 28056C.

The PriceInformation package 28022D includes a Price entity 28054D. There is one or zero 28056D Price entity 28054D for each Item entity 28056C. The Price entity 28054D includes a GrossAmount 28058D, a NetAmount 28066D, a TaxAmount 28074D, and a NetUnitPrice 28082.

The GrossAmount 28058D is of type GDT 28062D Amount 28064D, and there is one or zero 28060D GrossAmounts 28058D for each Price entity 28054D. The NetAmount 28066D is of type GDT 28070D Amount 28072D, and there is one 28068D NetAmount 28066D for each Price entity 28054D. The TaxAmount 28074D is of type GDT 28078D Amount 28080D, and there is one or zero 28076D TaxAmount 28074D for each Price entity 28054D. The NetUnitPrice 28082D is of type GDT 28086D Price 28088D, and there is one or zero 28084D NetUnitPrice 28082D for each Price entity 28054D. The Price entity 28054D also includes a Component entity 28006E. There are any number 28008E of Component entities 28006E for each Price entity 28054D.

The Tax package 28024D includes a ProductTax entity 28014E, which is of type GDT 28018E ProductTax 28020E. There are any number 28016E of ProductTax entities 28014E for each Item entity 28056C.

The Party package 28026D includes a BuyerParty entity 28022E, a SellerParty entity 28030E, a ProductRecipientParty entity 28038E, a VendorParty entity 28046E, a ManufacturerParty entity 28054E, and a CarrierParty entity 28062E. The BuyerParty entity 28022E is of type GDT 28026E BusinessTransactionDocumentParty 28028E. There is one or zero 28024E BuyerParty entity 28022E for each Item entity 28056C. The SellerParty entity 28030E is of type GDT 28034E BusinessTransactionDocumentParty 28036E. There is one or zero 28032E SellerParty entity 28030E for each Item entity 28056C. The ProductRecipientParty entity 28038E is of type GDT 28042E BusinessTransactionDocumentParty 28044E. There is one or zero 28040E ProductRecipientParty entity 28038E for each Item entity 28056C. The VendorParty entity 28046E is of type GDT 28050E BusinessTransactionDocumentParty 28052E. There is one or zero 28048E VendorParty entity 28046E for each Item entity 28056C. The ManufacturerParty entity 28054E is of type GDT 28058E BusinessTransactionDocumentParty 28060E. There is one or zero 28056E ManufacturerParty entity 28054E for each Item entity 28056C. The CarrierParty entity 28062E is of type GDT 28066E BusinessTransactionDocumentParty 28068E. There is one or zero 28064E CarrierParty entity 28062E for each Item entity 28056C.

The Location package 28028D includes a ShipToLocation entity 28070E and a ShipFromLocation entity 28078E. The ShipToLocation entity 28070E is of type GDT 28074E BusinessTransactionDocumentLocation 28076E, and there is one or zero 28072E ShipToLocation entity 28070E for each Item entity 28056C. The ShipFromLocation entity 28078E is of type GDT 28082E BusinessTransactionDocumentLocation 28084E, and there is one or zero 28080E ShipFromLocation entity 28078E for each Item entity 28056C.

The DeliveryInformation package 28030D includes a DeliveryTerms entity 28086E, which is of type GDT 28090E DeliveryTerms 28092E. There is one or zero 28088E DeliveryTerms entity 28086E for each Item entity 28056C.

The BusinessTransactionDocumentReference package 28032D includes a PurchaseOrderReference entity 28094E, a SalesOrderReference entity 28002F, a DeliveryReference entity 28010F, a ServiceAcknowledgementReference entity 28018F, an OriginInvoiceReference entity 28026F, a PurchaseContractReference entity 28034F, a SalesContractReference entity 28042F, a BuyerProductCatalogueReference entity 28050F, and a SellerProductCatalogueReference entity 28058F. The PurchaseOrderReference entity 28094E is of type GDT 28098E BusinessTransactionDocumentReference 28000F. There are any number 28096E of PurchaseOrderReference entities 28094E for each Item entity 28056C. The SalesOrderReference entity 28002F is of type GDT 28006F BusinessTransactionDocumentReference 28008F. There are any number 28004F of SalesOrderReference entities 28002F for each Item entity 28056C. The DeliveryReference entity 28010F is of type GDT 28014F BusinessTransactionDocumentReference 28016F. There is one or zero 28012F DeliveryReference entity 28010F for each Item entity 28056C. The ServiceAcknowledgementReference entity 28018F is of type GDT 28022F BusinessTransactionDocumentReference 28024F. There is one or zero 28020F ServiceAcknowledgementReference entity 28018F for each Item entity 28056C. The OriginInvoiceReference entity 28026F is of type GDT 28030F BusinessTransactionDocumentReference 28032F. There is one or zero 28028F OriginInvoiceReference entity 28026F for each Item entity 28056C. The PurchaseContractReference entity 28034F is of type GDT 28038F BusinessTransactionDocumentReference 28040F. There is one or zero 28036F PurchaseContractReference entity 28034F for each Item entity 28056C. The SalesContractReference entity 28042F is of type GDT 28046F BusinessTransactionDocumentReference 28048F. There is one or zero 28044F SalesContractReference entity 28042F for each Item entity 28056C. The BuyerProductCatalogueReference entity 28050F is of type GDT 28054F CatalogueReference 28056F. There is one or zero 28052F BuyerProductCatalogueReference entity 28050F for each Item entity 28056C. The SellerProductCatalogueReference entity 28058F is of type GDT 28062F CatalogueReference 28064F. There is one or zero 28060F SellerProductCatalogueReference entity 28058F for each Item entity 28056C.

The Attachment package 28034D includes an Attachment entity 28066F, which is of type GDT 28070F Attachment 28072F. There are any number 28068F of Attachment entities 28066F for each Item entity 28056C.

The Description package 28038D includes a Description entity 28074F and a ConfirmedDescription entity 28082F. The Description entity 28074F is of type GDT 28078F Description 28080F. There is one or zero 28076F Description entity 28074F for each Item entity 28056C. The ConfirmedDescription entity 28082F is of type GDT 28086F Description 28088F. There is one or zero 28084F ConfirmedDescription entity 28082F for each Item entity 28056C.

An example of an Invoice Request message in XML is provided below:

```
<?xml version="1.0" encoding="utf-8" ?>
- <nr1:InvoiceRequest xmlns:nr1="http://sap.com/xi/SAPGlobal/Global">
- <MessageHeader>
  <ID schemeID="0402">00000004440000000020040723063339</ID>
  <CreationDateTime>2004-07-23T06:33:39Z</CreationDateTime>
- <SenderParty>
  <InternalID schemeID="PartnerID" schemeAgencyID=
  "E5S_300">6<IntenalID>
  </SenderParty>
- <RecipientParty>
  <InternalID schemeID="PartnerID" schemeAgencyID=
  "E5S_300">1000</InternalID>
  </RecipientParty>
  </MessageHeader>
- <Invoice>
  <ID>NB1_LIM2</ID>
  <TypeCode>004</TypeCode>
  <DateTime>2004-06-30T12:00:00Z</DateTime>
  <Note>Nachbelastung zu Rechnung 442</Note>
- <BillToParty>
  <BillToID>6</BillToID>
  </BillToParty>
- <BillFromParty>
  <BillToID>1999</BillToID>
  </BillFromParty>
```

-continued

```
- <SellerParty>
  <BillToID>1000</BillToID>
  </SellerParty>
- <ProductRecipientParty>
  <BillToID>10754</BillToID>
  </ProductRecipientParty>
- <Price>
  <GrossAmount currencyCode="EUR">1.16</GrossAmount>
  </Price>
- <ProductTax>
  <TypeCode>VAT</TypeCode>
  <TypeDescription languageCode="de">16 %</TypeDescription>
  <BaseAmount currencyCode="EUR">1.0</BaseAmount>
  <Percent>16.0</Percent>
  <Amount currencyCode="EUR">0.16</Amount>
  <BusinessTransactionDocumentItemGroupID>V1
</BusinessTransactionDocumentItemGroupID>
  </ProductTax>
- <Item>
  <ID>1</ID>
  <TypeCode>002</TypeCode>
- <Product>
  <TypeCode>1</TypeCode>
  <Note>a1</Note>
  </Product>
- <ProductCategory>
  <BillToID>LOC01</BillToID>
  </ProductCategory>
  <Quantity unitCode="PCE">1.0</Quantity>
- <Price>
  <NetAmount currencyCode="EUR">1.0</NetAmount>
- <NetUnitPrice>
  <Amount currencyCode="EUR">1.0</Amount>
  <BaseQuantity unitCode="PCE">1.0</BaseQuantity>
  </NetUnitPrice>
- <ExchangeRate>
  <UnitCurrency>EUR</UnitCurrency>
  <QuotedCurrency>USD</QuotedCurrency>
  <Rate>1.16</Rate>
  </ExchangeRate>
  </Price>
- <ProductTax>
  <TypeCode>VAT</TypeCode>
  <TypeDescription languageCode="de">16 %</TypeDescription>
  <BaseAmount currencyCode="EUR">0.0</BaseAmount>
  <Amount currencyCode="EUR">0.0</Amount>
  <BusinessTransactionDocumentItemGroupID>V1
</BusinessTransactionDocumentItemGroupID>
  </ProductTax>
- <PurchaseOrderReference>
  <ID>6500000123</ID>
  <ItemID>1</ItemID>
  </PurchaseOrderReference>
  </Item>
  </Invoice>
  </nr1:InvoiceRequest>
```

6. Use of an Interface

Figure 281:
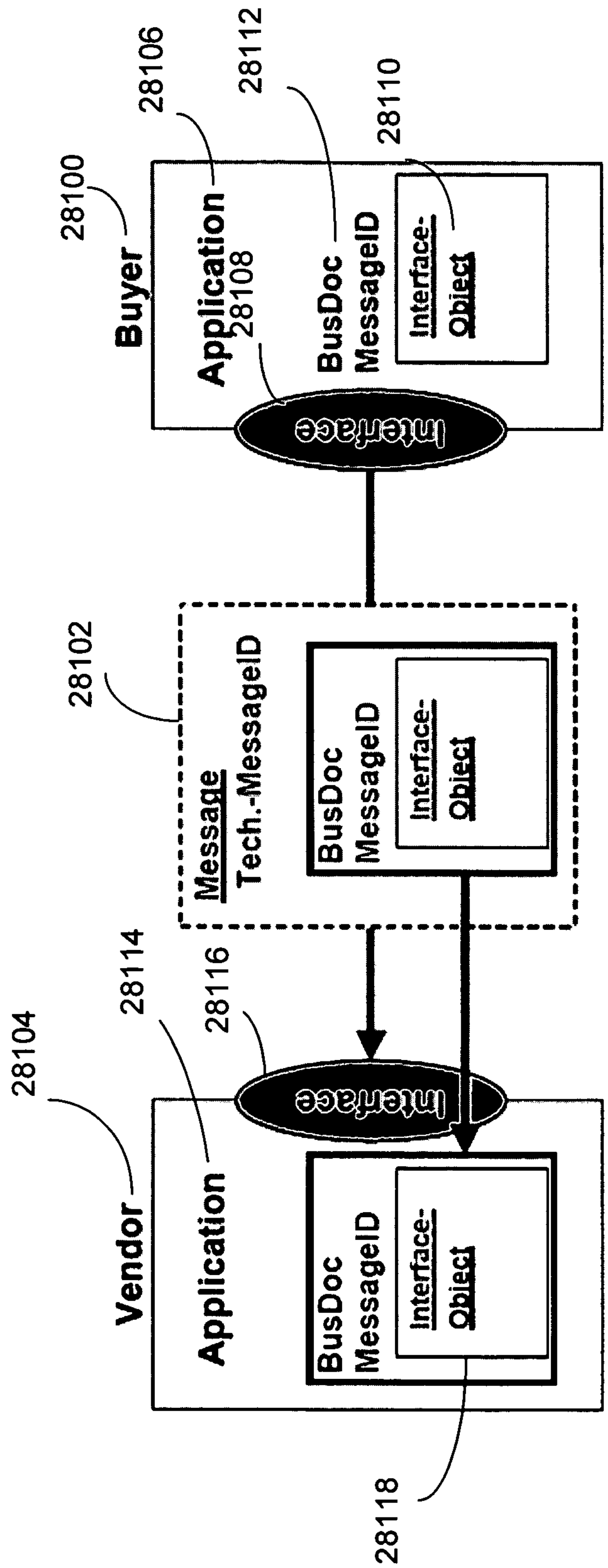
FIG. 281 depicts an example illustrating the transmittal of a business document in accordance with methods and systems consistent with the present invention.

The XI stores the interfaces (as an interface type). At runtime, the sending party's program instantiates the interface to create a business document, and sends the business document in a message to the recipient. The messages are preferably defined using XML. In the example depicted in FIG. 281, the Buyer 28100 uses an application 28106 in its system to instantiate an interface 28108 and create an interface object or business document object 28110. The Buyer's application 28106 uses data that is in the sender's component-specific structure and fills the business document object 28110 with the data. The Buyer's application 28106 then adds message identification 28112 to the business document and places the business document into a message 28102. The Buyer's application 28106 sends the message 28102 to the Vendor 28104. The Vendor 28104 uses an application 28114 in its system to receive the message 28102 and store the business document into its own memory. The Vendor's application 28114 unpacks the message 28102 using the corresponding interface 28116 stored in its XI to obtain the relevant data from the interface object or business document object 28118.

Figure 282:
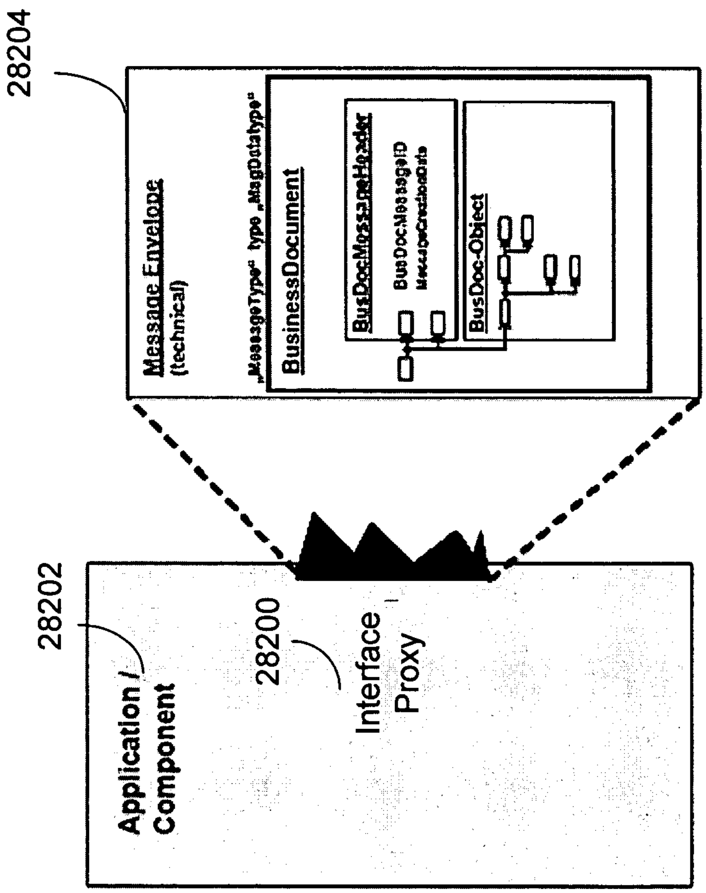
FIG. 282 depicts the interface proxy in accordance with methods and systems consistent with the present invention.
Figure 283:
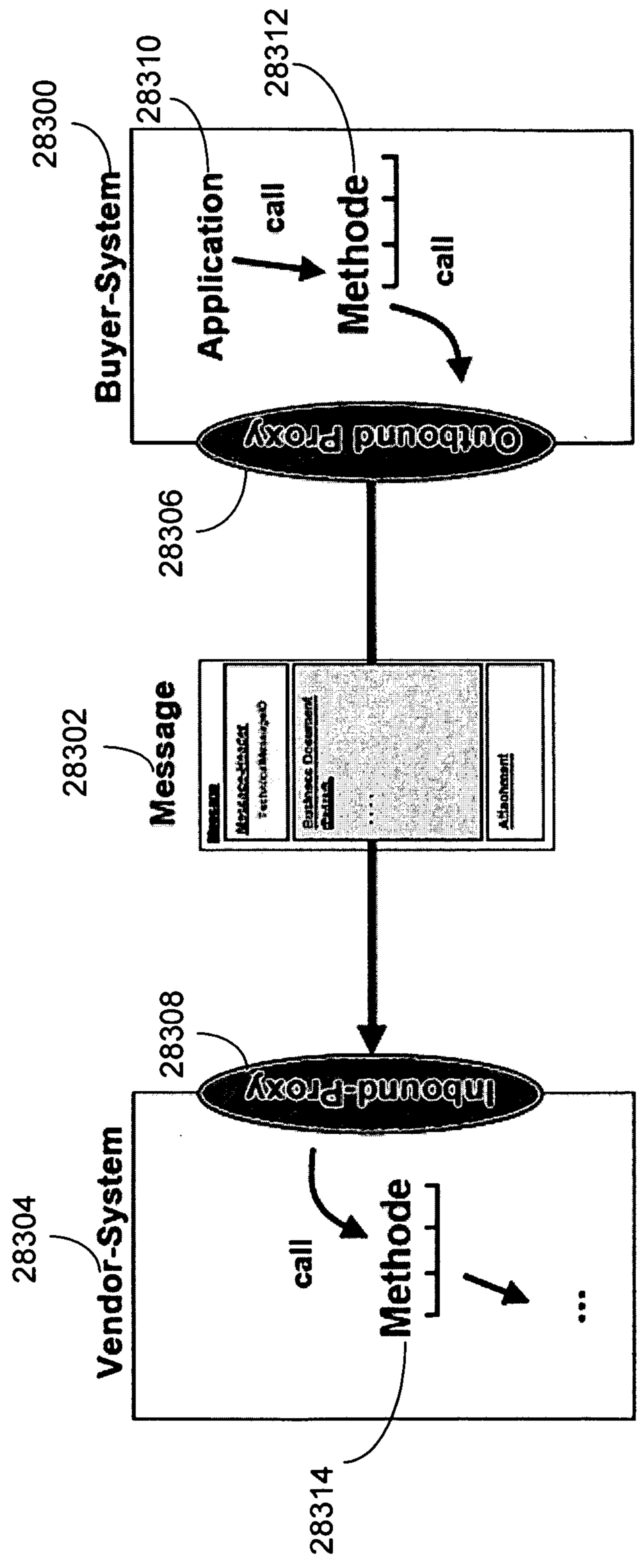
FIG. 283 depicts an example illustrating the transmittal of a message using proxies in accordance with methods and systems consistent with the present invention.

From the component's perspective, the interface is represented by an interface proxy 28200, as depicted in FIG. 282. The proxies 28200 shield the components 28202 of the sender and recipient from the technical details of sending messages 28204 via XI. In particular, as depicted in FIG. 283, at the sending end, the Buyer 28300 uses an application 28310 in its system to call an implemented method 28312, which generates the outbound proxy 28306. The outbound proxy 28306 parses the internal data structure of the components and converts them to the XML structure in accordance with the business document object. The outbound proxy 28306 packs the document into a message 28302. Transport, routing and mapping the XML message to the recipient 28304 is done by the routing system (XI, Netweaver, etc.).

When the message arrives, the recipient's inbound proxy 28308 calls its component-specific method 28314 for creating a document. The proxy 28308 at the receiving end downloads the data and converts the XML structure into the internal data structure of the recipient component 28304 for further processing.

Figure 284:
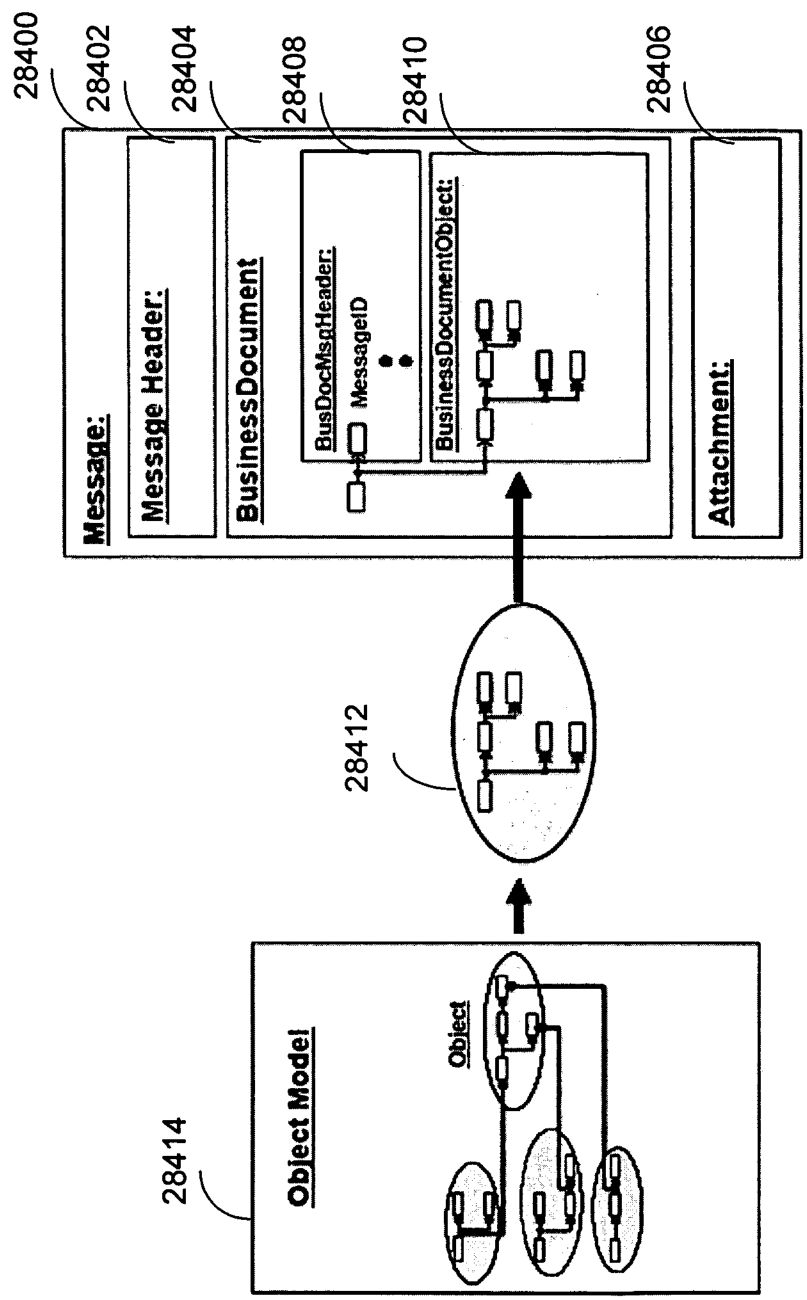
FIG. 284 depicts the components of a message in accordance with methods and systems consistent with the present invention.

As depicted in FIG. 284, a message 28400 includes a message header 28402 and a business document 28404. The message 28400 also may include an attachment 28406. For example, the sender may attach technical drawings, detailed specifications or pictures of a product to a purchase order for the product. The business document 28404 includes a business document message header 28408 and the business document object 28410. The business document message header 28408 includes administrative data, such as the message ID and a message description. As discussed above, the structure 28412 of the business document object 28410 is derived from the business object model 28414. Thus, there is a strong correlation between the structure of the business document object and the structure of the business object model. The business document object 28410 forms the core of the message 28400.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 285:
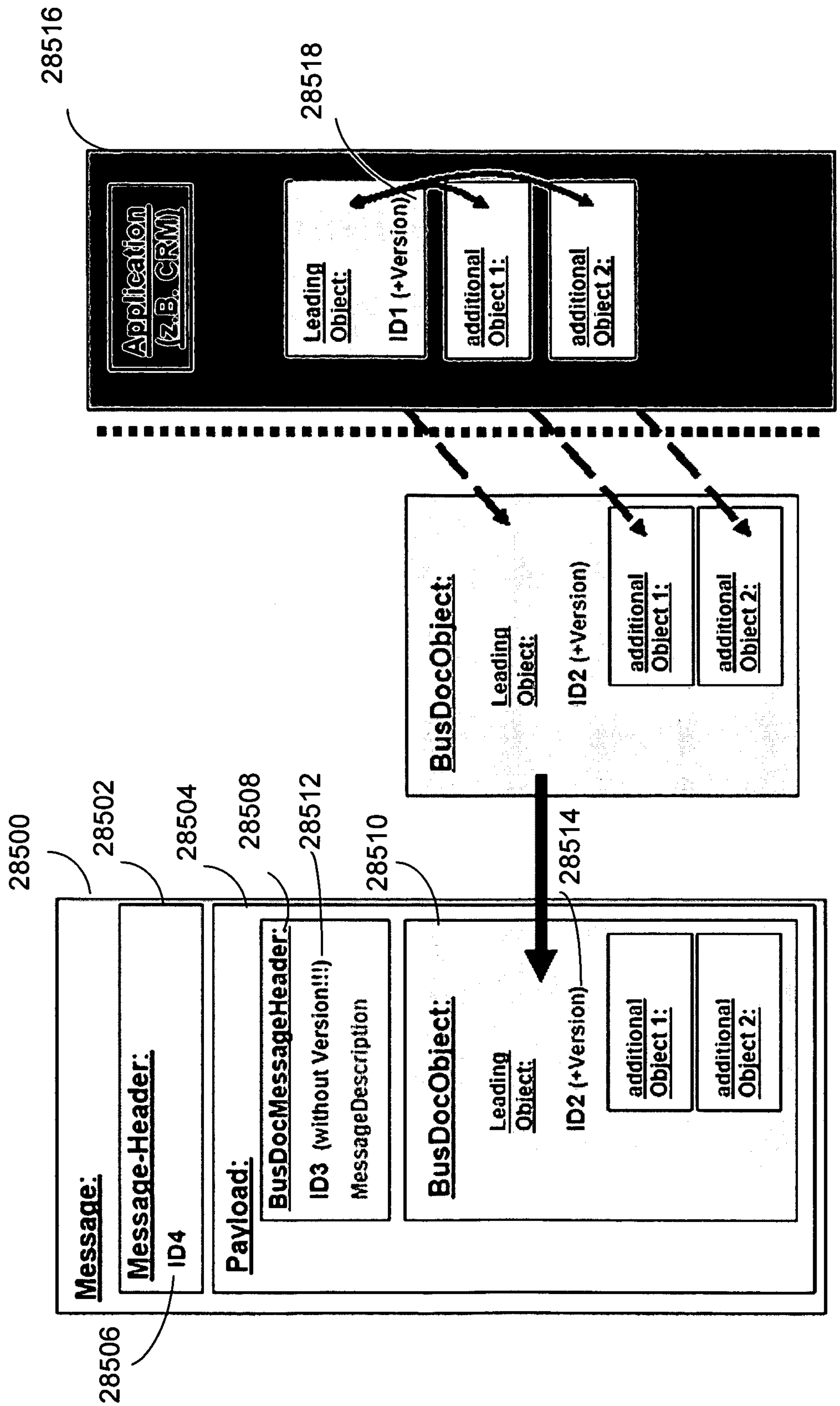
FIG. 285 depicts the IDs used in a message in accordance with methods and systems consistent with the present invention.

As depicted in FIG. 285, the message header 28502 in message 28500 includes a technical ID ("ID4") 28506 that identifies the address for a computer to route the message. The sender's system manages the technical ID 28506.

The administrative information in the business document message header 28508 of the payload or business document 28504 includes a BusinessDocumentMessageID ("ID3") 28512. The business entity or component 28516 of the business entity manages and sets the BusinessDocumentMessageID 28512. The business entity or component 28516 also can refer to other business documents using the BusinessDocumentMessageID 28512. The receiving component 28516 requires no knowledge regarding the structure of this ID. The BusinessDocumentMessageID 28512 is, as an ID, unique. Creation of a message refers to a point in time. No versioning is expressed by the ID. Besides the BusinessDocumentMessageID 28512, there also is a business document object ID 28514, which may include versions.

The component 28516 also adds its own component object ID 28518 when the business document object is stored in the component. The component object ID 28518 identifies the business document object when it is stored within the component. However, not all communication partners may be aware of the internal structure of the component object ID 28518. Some components also may include a versioning in their ID 28518.

Figure 286:
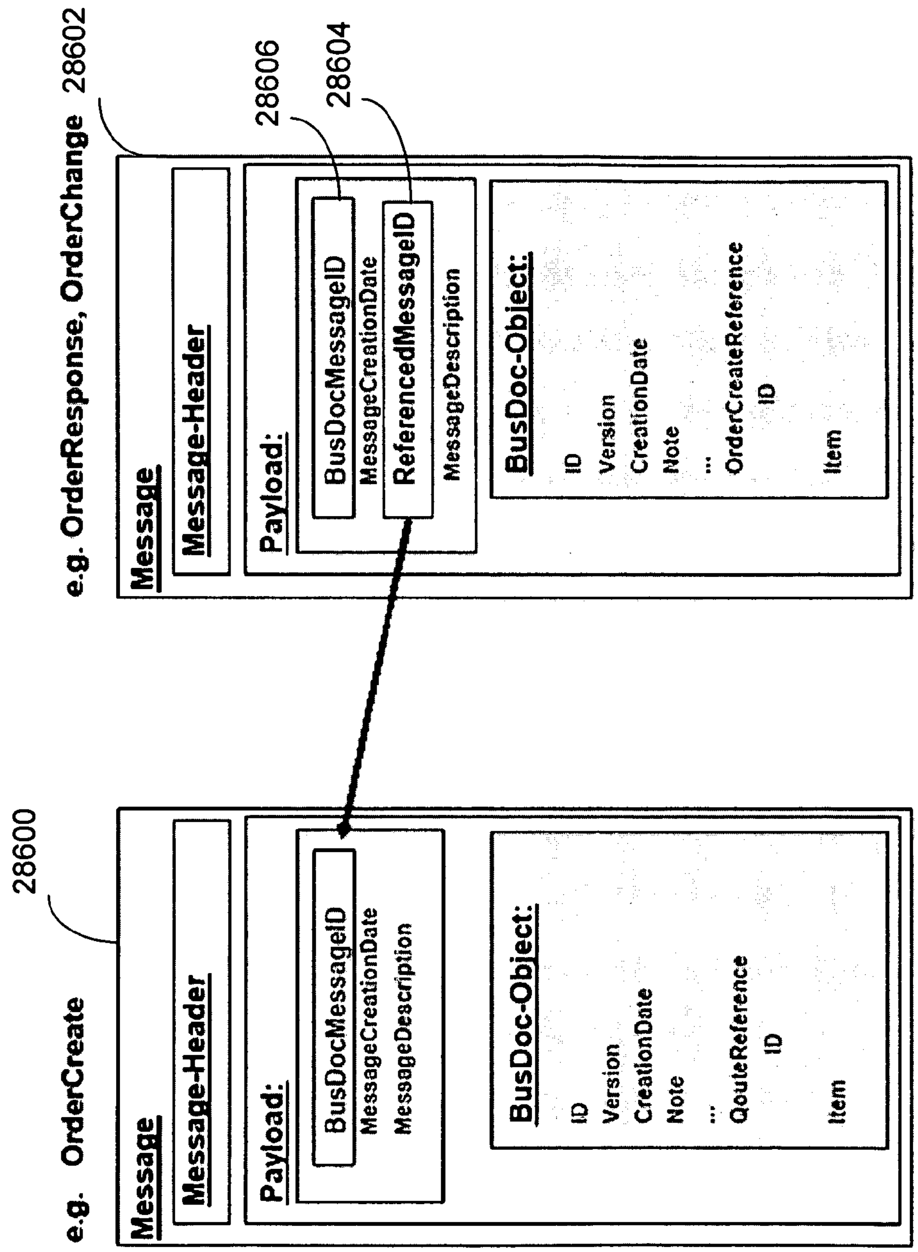
FIG. 286 depicts the reference to previous messages in accordance with methods and systems consistent with the present invention.
Figure 287:
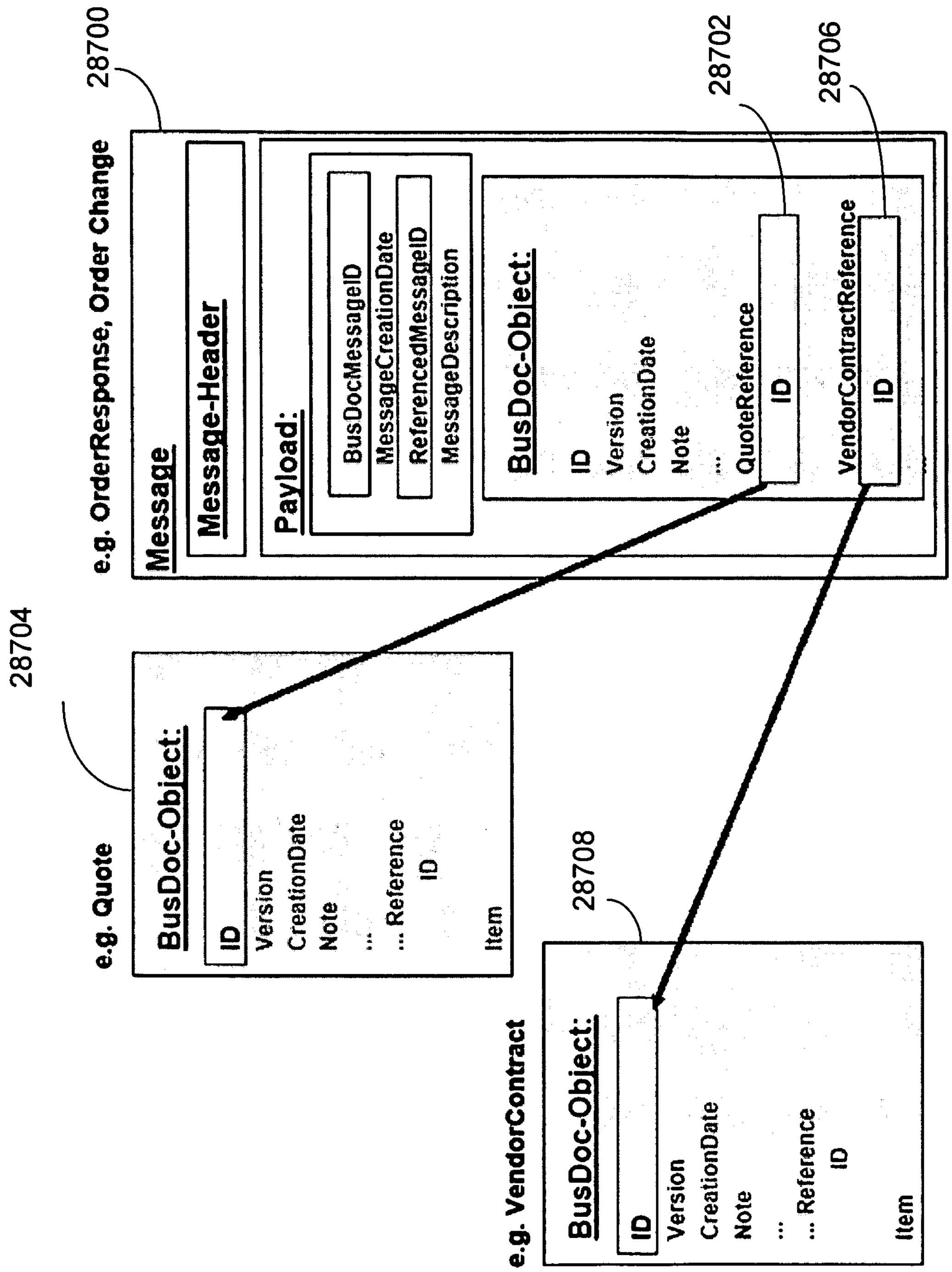
FIG. 287 depicts the reference to business documents from previous transactions in accordance with methods and systems consistent with the present invention.

The ReferencedMessageID refers to a previous message. For example, as depicted in FIG. 286, a response 28602 to a message 28600 includes a referenced message ID 28604 referring to the original message. Moreover, documents from previous transactions may be referenced in a message. The BusinessDocumentMessageID 28606 refers to such documents. For example, as depicted in FIG. 287, an order response or order change 28700 includes an ID 28702 referring to the original Quote 28704 or an ID 28706 referring to the original Vendor Contract 28708 within the Business Transaction Document ID.

7. Use of Interfaces Across Industries

Figure 310:
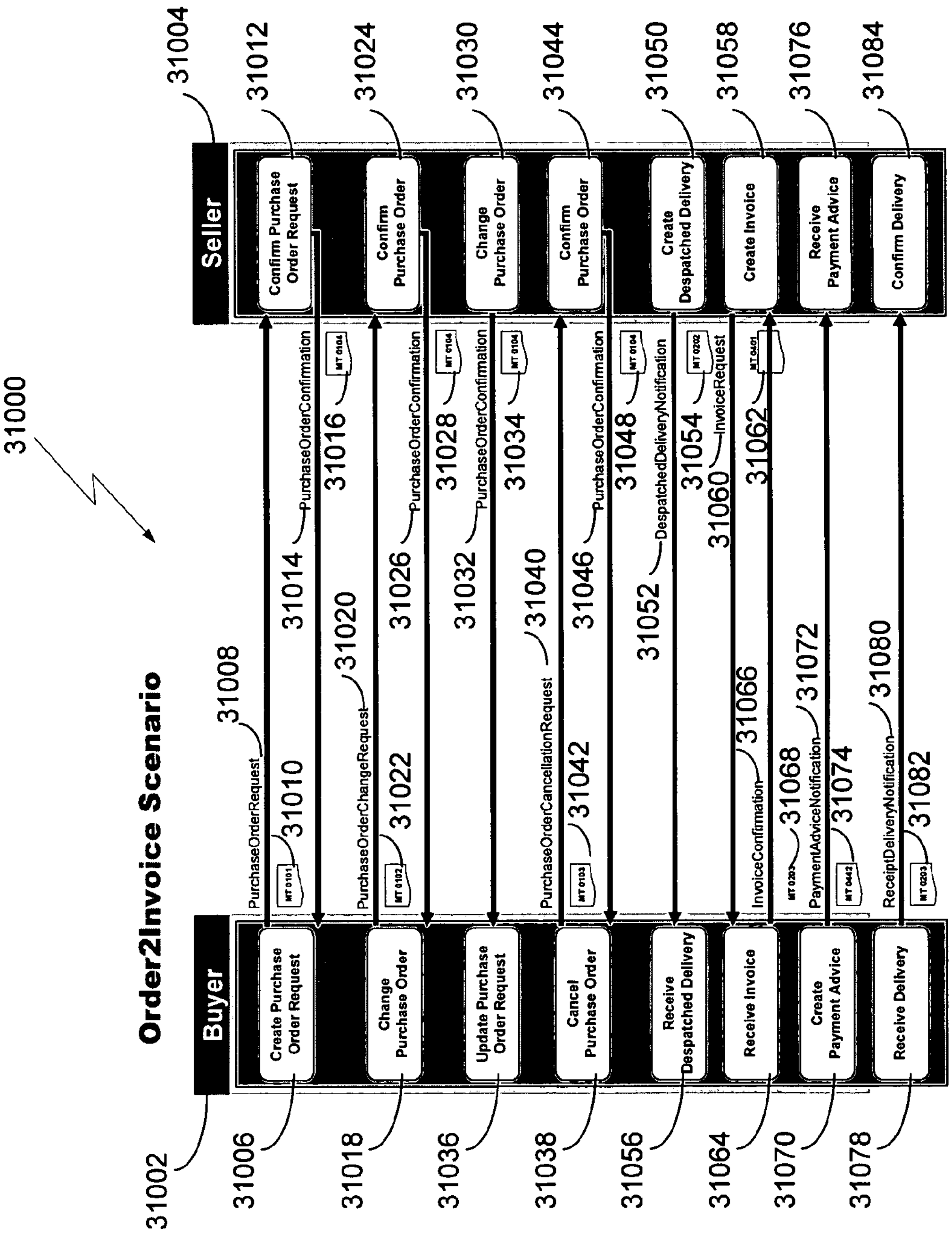
FIG. 310 depicts the message choreography for the Order to Invoice in accordance with methods and systems consistent with the present invention.

Methods and systems consistent with the present invention provide interfaces that may be used across different business areas for different industries. For example, FIG. 310 depicts the message choreography 31000 for an Order to Invoice scenario between a buyer 31002 and seller 31004. The buyer 31002 creates a purchase order request 31006, and sends a PurchaseOrderRequest 31008 to the seller 31004 to deliver goods or render services. The message type 31010 of the PurchaseOrderRequest 31008 is 0101, as defined above. In response, the seller 31004 confirms the purchase order request 31012, and sends a PurchaseOrderConfirmation 31014 to the buyer 31002. The message type 31016 of the PurchaseOrderConfirmation 31014 is 0104.

The buyer 31002 may change the purchase order 31018 by sending a PurchaseOrderChangeRequest 31020 to the seller 31004. The message type 31022 of the PurchaseOrderChangeRequest 31020 is 0102. In response, the seller 31004 may confirm the purchase order 31024 by sending a PurchaseOrderConfirmation 31026 to the buyer 31002. The message type 31028 of the PurchaseOrderConfirmation 31026 is 0104.

The seller 31004 may change a purchase order 31030 by sending a PurchaseOrderConfirmation 31032 to the buyer 31002. The message type 31034 of the PurchaseOrderConfirmation 31032 is 0104. In response, the buyer updates the purchase order request 31036.

The buyer 31002 may cancel a purchase order 31038 by sending a PurchaseOrderCancellationRequest 31040 to the seller 31004. The message type 31042 of the PurchaseOrderCancellationRequest 31040 is 0103. In response, the seller 31004 may confirm the purchase order cancellation 31044 by sending a PurchaseOrderConfirmation 31046 to the buyer 31002. The message type 31048 of the PurchaseOrderConfirmation 31046 is 0104.

The seller 31004 may create a dispatched delivery 31050 and send a DespatchedDeliveryNotification 31052 to the buyer 31002. The message type 31054 of the DespatchedDeliveryNotification 31052 is 0202. In response the buyer 31002 receives the dispatched delivery 31056.

The seller 31004 may create an invoice 31058 and send an InvoiceRequest 31060 to the buyer 31002. The message type 31062 of the InvoiceRequest 31060 is 0401. In response, the buyer 31002 receives the invoice 31064, and may send an InvoiceConfirmation 31066 to the seller 31004. The message type 31068 of the InvoiceConfirmation 31066 is 0401.

The buyer 31002 may create payment advice 31070 and send a PaymentAdviceNotification 31072 to the seller 31004, who receives the payment advice 31076. The message type 31074 of the PaymentAdviceNotification 31072 is 0442. The buyer 31002, after receiving delivery 31078, may send a ReceiptDeliveryNotification 31080 to the seller 31004 to confirm delivery 31084. The message type 31082 of the ReceiptDeliveryNotification 31080 is 0203.

Figure 311:
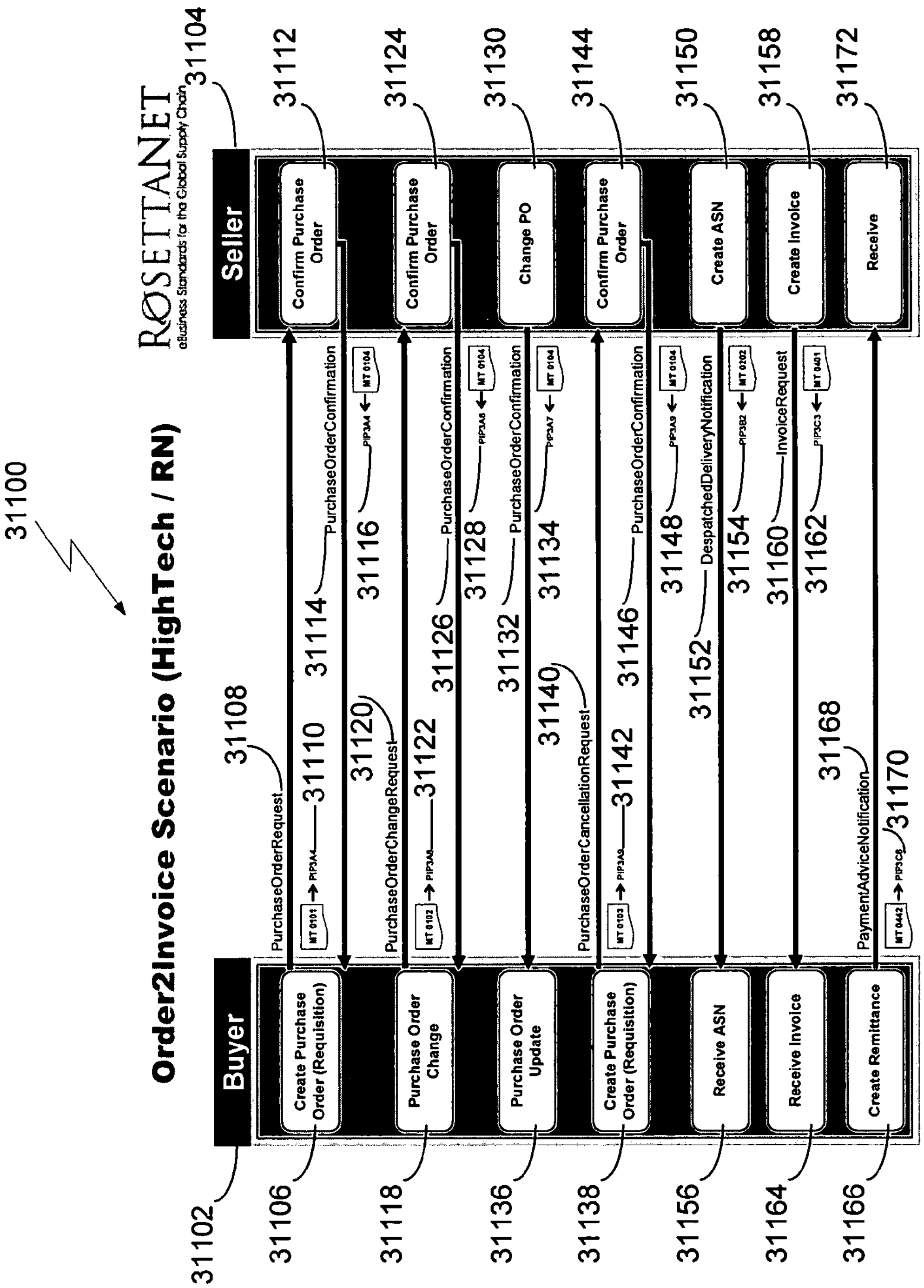
FIG. 311 depicts the message choreography for the Order to Invoice provided by RosettaNet.

The interfaces derived using methods and systems consistent with the present invention also may be mapped for use under various standards. For example, FIG. 311 depicts the message choreography 31100 for an Order to Invoice scenario provided by RosettaNet, i.e., the high tech industry standard. As shown, the buyer 31102 creates a purchase order (requisition) 31106, and sends a PurchaseOrderRequest 31108 to the seller 31104. The message type of the PurchaseOrderRequest 31108 is 0101, which corresponds to RosettaNet's PIP3A4 message type 31110. In response, the seller 31104 confirms the purchase order request 31112, and sends a PurchaseOrderConfirmation 31114 to the buyer 31102. The message type of the PurchaseOrderConfirmation 31114 is 0104, which corresponds to RosettaNet's PIP3A4 message type 31116.

The buyer 31102 may then change the purchase order 31118 by sending a PurchaseOrderChangeRequest 31120 to the seller 31104. The message type of the PurchaseOrderChangeRequest 31120 is 0102, which corresponds to RosettaNet's PIP3A8 message type 31122. In response, the seller 31104 may confirm the purchase order 31124 by sending a PurchaseOrderConfirmation 31126 to the buyer 31102. The message type of the PurchaseOrderConfirmation 31126 is 0104, which corresponds to RosettaNet's PIP3A8 message type 31128.

The seller 31104 may change a purchase order 31130 by sending a PurchaseOrderConfirmation 31132 to the buyer 31102. The message type of the PurchaseOrderConfirmation 31132 is 0104, which corresponds to RosettaNet's PIP3A7 message type 31134. In response, the buyer 31102 updates the purchase order request 31136.

The buyer 31102 may cancel a purchase order 31138 by sending a PurchaseOrderCancellationRequest 31140 to the seller 31104. The message type of the PurchaseOrderCancellationRequest 31140 is 0103, which corresponds to RosettaNet's PIP3A9 message type 31142. In response, the seller 31104 may confirm the purchase order cancellation 31144 by sending a PurchaseOrderConfirmation 31146 to the buyer 31102. The message type of the PurchaseOrderConfirmation 31146 is 0104, which corresponds to RosettaNet's PIP3A9 message type 31148.

The seller 31104 may create an ASN 31150 and send a DespatchedDeliveryNotification 31152 to the buyer 31102. The message type of the DespatchedDeliveryNotification 31152 is 0202, which corresponds to RosettaNet's PIP3B2 message type 31154. In response, the buyer 31102 receives the ASN 31156.

The seller 31104 may create an invoice 31158 and send an InvoiceRequest 31160 to the buyer 31102. The message type of the InvoiceRequest 31160 is 0401, which corresponds to RosettaNet's PIP3C3 message type 31162. In response, the buyer 31102 receives the invoice 31164.

The buyer 31102 may create a remittance 31166 and send a PaymentAdviceNotification 31168 to the seller 31104, who receives the payment advice 31172. The message type of the PaymentAdviceNotification 31168 is 0442, which corresponds to RosettaNet's PIP3C6 message type 31170.

Figure 312:
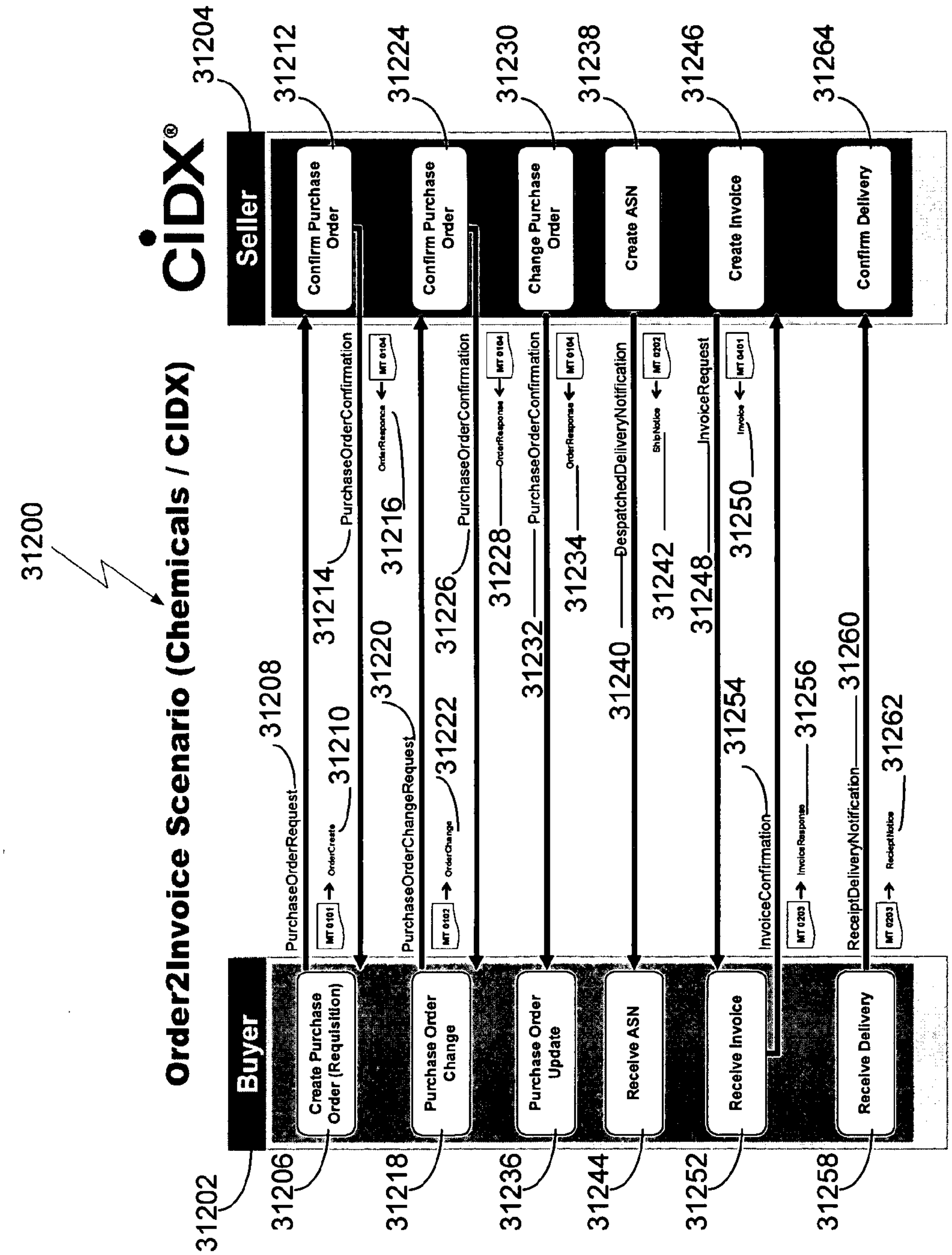
FIG. 312 depicts the message choreography for the Order to Invoice provided by CIDX.

FIG. 312 depicts the message choreography 31200 for an Order to Invoice scenario provided by CIDX, i.e., the chemical industry standard. As shown, the buyer 31202 creates a purchase order (requisition) 31206, and sends a PurchaseOrderRequest 31208 to the seller 31204. The message type of the PurchaseOrderRequest 31208 is 0101, which corresponds to CIDX's OrderCreate message 31210. In response, the seller 31204 confirms the purchase order 31212, and sends a PurchaseOrderConfirmation 31214 to the buyer 31202. The message type of the PurchaseOrderConfirmation 31214 is 0104, which corresponds to CIDX's OrderResponse message 31216.

The buyer 31202 may change the purchase order 31218 by sending a PurchaseOrderChangeRequest 31220 to the seller 31204. The message type of the PurchaseOrderChangeRequest 31220 is 0102, which corresponds to CIDX's OrderChange message 31222. In response, the seller 31204 may confirm the purchase order 31224 by sending a PurchaseOrderConfirmation 31226 to the buyer 31202. The message type of the PurchaseOrderConfirmation 31226 is 0104, which corresponds to CIDX's OrderResponse message 31228.

The seller 31204 may change a purchase order 31230 by sending a PurchaseOrderConfirmation 31232 to the buyer 31202. The message type of the PurchaseOrderConfirmation 31232 is 0104, which corresponds to CIDX's OrderResponse message 31234. In response, the buyer 31202 updates the purchase order request 31236.

The seller may create an ASN 31238 and send a DespatchedDeliveryNotification 31240 to the buyer 31202. The message type of the DespatchedDeliveryNotification 31240 is 0202, which corresponds to CIDX's ShipNotice message 31242. In response the buyer 31202 receives the ASN 31244.

The seller 31204 may create an invoice 31246 and send an InvoiceRequest 31248 to the buyer 31202. The message type of the InvoiceRequest 31248 is 0401, which corresponds to CIDX's Invoice message 31250. In response, the buyer 31202 receives the invoice 31252, and may send an InvoiceConfirmation 31254 to the seller 31204. The message type of the InvoiceConfirmation 31254 is 0203, which corresponds to CIDX's InvoiceResponse message 31256.

After receiving delivery 31258, the buyer 31202 may send a ReceiptDeliveryNotification 31260 to the seller 31204, who confirms delivery 31264. The message type of the ReceiptDeliveryNotification 31260 is 0203, which corresponds to CIDX's ReceiptNotice message 31262.

A table identifying the relationship between the interfaces derived using methods and systems consistent with the present invention and the interfaces provided by RosettaNet and CIDX is shown below. The number in the brackets identifies the number of fields within the interface.

| Interface | RosettaNet | CIDX |
|---|---|---|
| MT101 PurchaseOrderRequest | PIP3A4 PurchaseOrder Request (557) | OrderCreate (1030) |
| MT102 PurchaseOrderChangeRequest | PIP3A8 PurchaseOrder ChangeRequest (627) | OrderChange (1000) |
| MT103 PurchaseOrderCancellationRequest | PIP3A9 PurchaseOrder CancellationRequest (31) | OrderChange (all Items deleted) |

-continued

| Interface | RosettaNet | CIDX |
|---|---|---|
| MT104 PurchaseOrderConfirmation | PIP3A4 PurchaseOrder Confirmation (712) | OrderResponse (1020) |
| MT104 PurchaseOrderConfirmation | PIP3A8 PurchaseOrder ChangeConfirmation (743) | |
| MT104 PurchaseOrderConfirmation | PIP3A7 PurchaseOrder UpdateNotification (745) | |
| MT104 PurchaseOrderConfirmation | PIP3A9 PurchaseOrder CancellationConfirmation (34) | |
| MT202 DespatchedDeliveryNotification | PIP3B2 AdvanceShipment otification (253) | ShipNotice (1000) |
| MT203 ReceivedDeliveryNotification | | ReceiptNotice (640) (Delivery Receipt, Delivery Receipt Response) |
| MT401 InvoiceRequest | PIP3C3 InvoiceNotification (391) | Invoice (800) |
| MT402 InvoiceConfirmation | | InvoiceResponse (350) |
| MT442 PaymentAdviceNotification | PIP3C6 RemittanceAdvice otification (117) | |

As illustrated above, the interfaces derived using methods and systems consistent with the present invention may be mapped onto the interfaces of different industry standards. Unlike the interfaces provided by any given standard that do not include the interfaces required by other standards, methods and systems consistent with the present invention provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the present invention include most of the fields provided by the interfaces of different industry standards. Any missing fields may easily be included into the business object model. Thus, by derivation, the interfaces can be extended consistently by these fields. Thus, methods and systems consistent with the present invention provide consistent interfaces that can be used across different industry standards.

C. Exemplary Interfaces a) Purchase Requirement Interfaces

Purchase requirement interfaces are used to exchange purchase requisitions for products (materials, services) between a requester (in the PTS scenario, an MRP controller, for example) and a buyer, and confirmations that these requisitions have been fulfilled.

The motivating business scenario for the PurchaseRequirementRequest and PurchaseRequirementConfirmation interfaces is the Procure to Stock (PTS) scenario. In the PTS scenario, a planning system (SCP) or the "requester," generates purchase requisitions that are procured externally by a procurement system (SRM) or the "buyer."

(1) Message Types

Two messages types are available for mapping an A2A requisition process: (1) the message type PurchaseRequirementRequest is sent from the requester (a requirements planner in the PTS scenario or a planning/requirements system, for example) to the buyer and is used to start a new requirements process. From now on, this document will simply use the terms 'requester' and 'buyer'; and (2) the message type PurchaseRequirementConfirmation is sent from the buyer to the requester. It informs the requester of the extent to which the requirement has been fulfilled.

(a) Purchase Requirement Request

A PurchaseRequirementRequest is a request from a requester asking a buyer to procure products (materials or services) externally. The structure of the message type PurchaseRequirementRequest is specified by the message data type PurchaseRequirementMessage. A PurchaseRequirementRequest message results in the relevant requisition being created or changed in the procurement system. The procurement system accepts changes made to a requisition (except for technical errors). If the procurement system (buyer) cannot procure a requisition or partial quantity of a requisition (rejection), the procurement system indicates this by outputting the PurchaseRequirementConfirmation message.

(b) Purchase Requirement Confirmation

A PurchaseRequirementConfirmation is a confirmation of the buyer that informs the requester of the extent to which a requisition has been fulfilled. The structure of the message type PurchaseRequirementConfirmation is specified by the message data type PurchaseRequirementMessage. If a procurement system (buyer) cannot fulfill a requisition or partial quantity of a requisition, the buyer indicates this by outputting the PurchaseRequirementConfirmation message. The buyer cannot cancel a rejection of a requisition.

(2) Message Choreography

Figure 288:
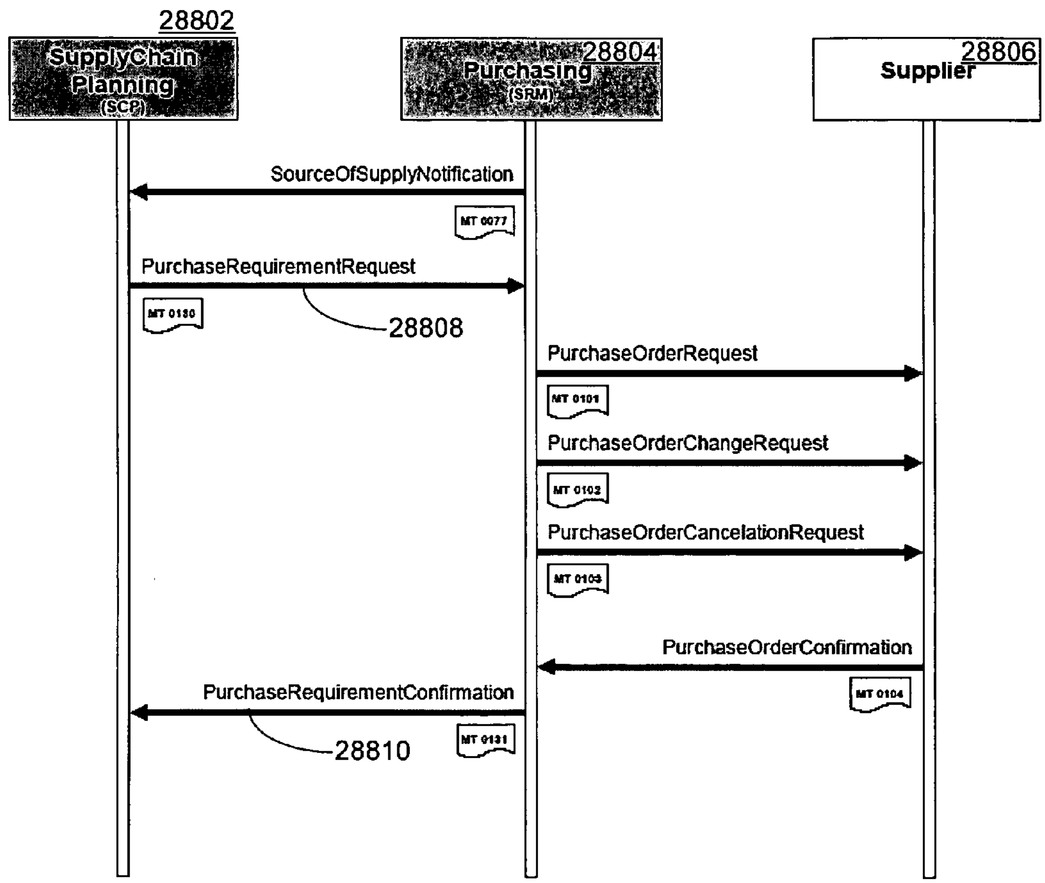
FIG. 288 depicts the message choreography for the Purchase Requirement interfaces in accordance with methods and systems consistent with the present invention.
Figure 289A:
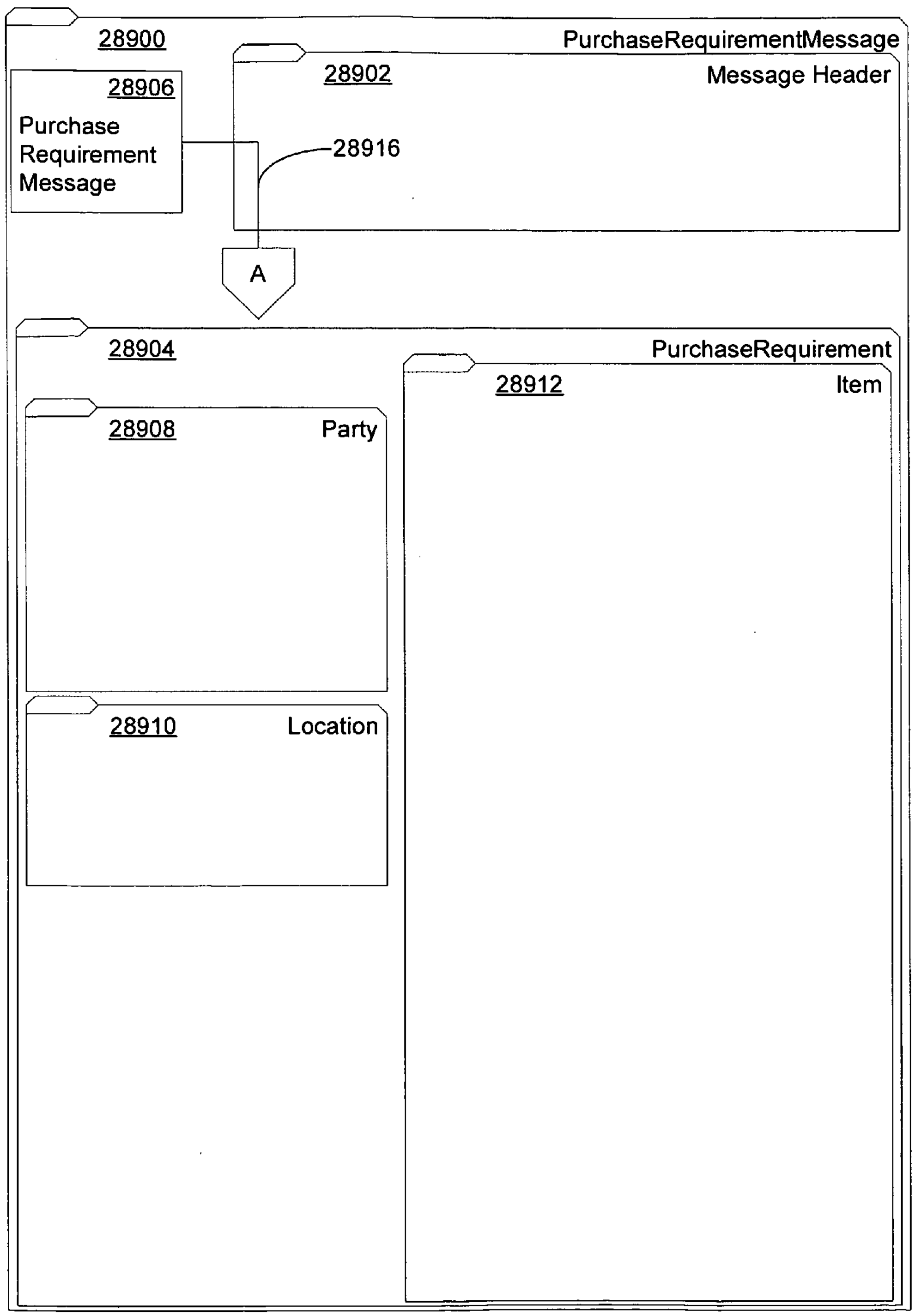
FIGS. 289A-H depict the data model for the Purchase Requirement interfaces in accordance with methods and systems consistent with the present invention.
Figure 289B:
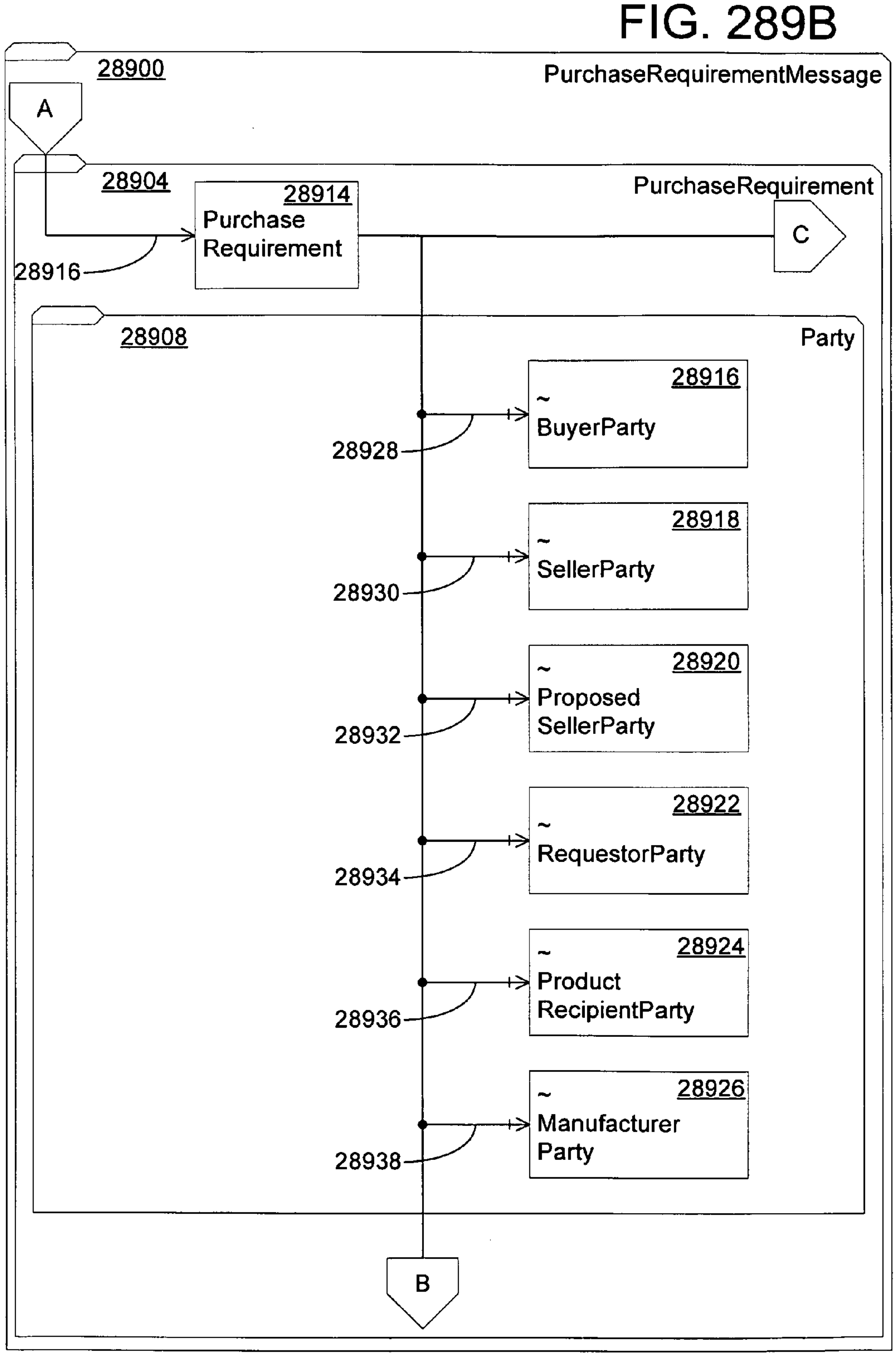
Figure 289C:
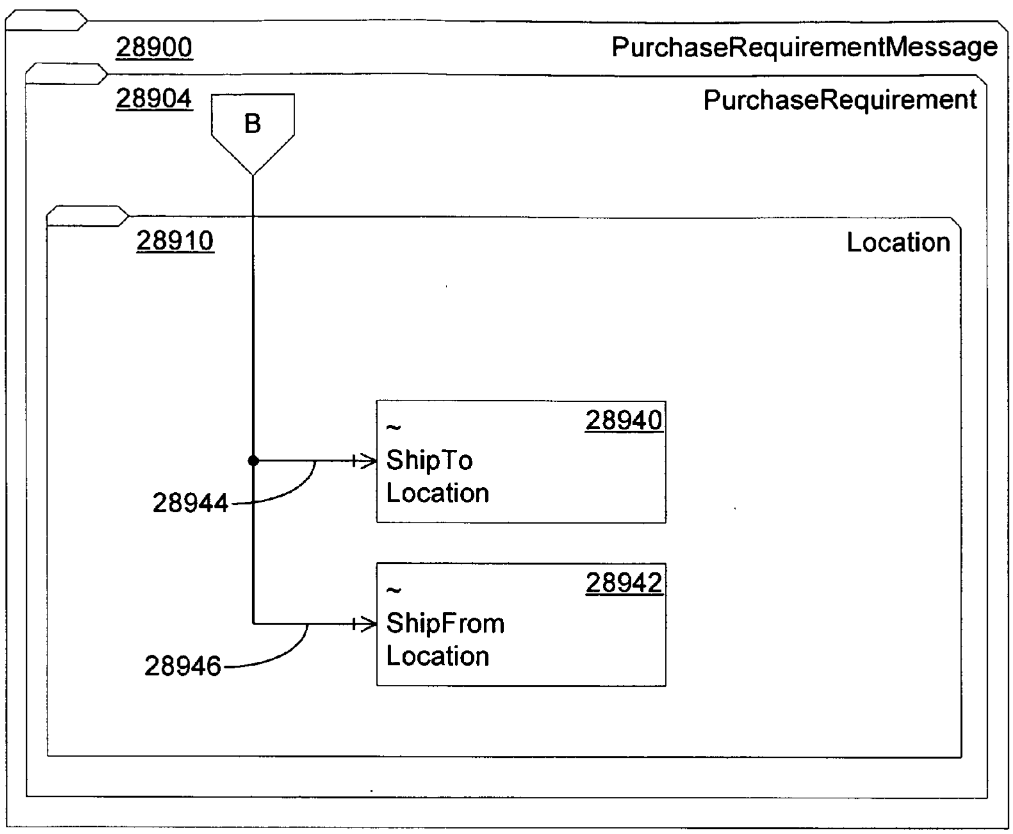
Figure 289D:
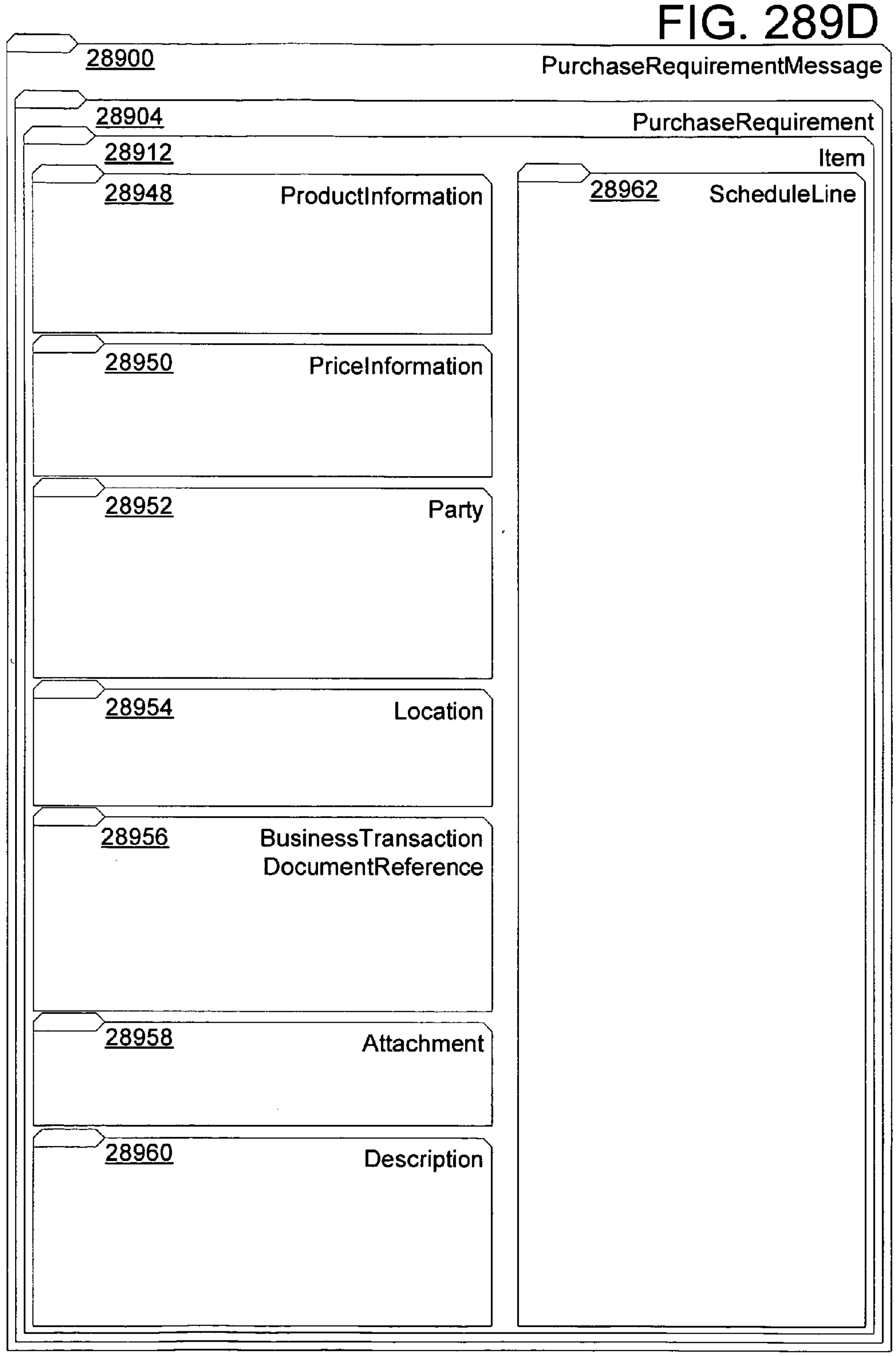
Figure 289E:
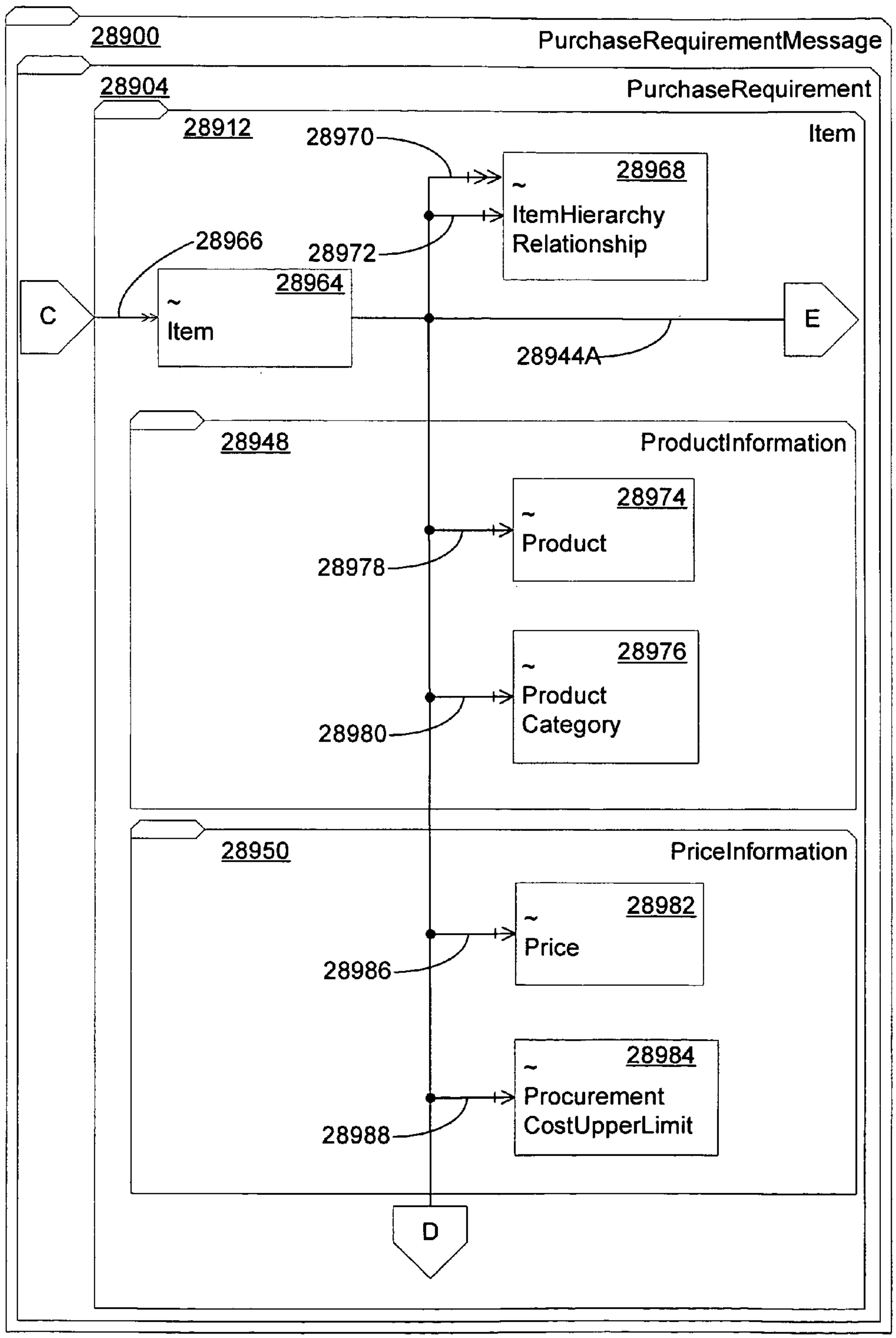
Figure 289F:
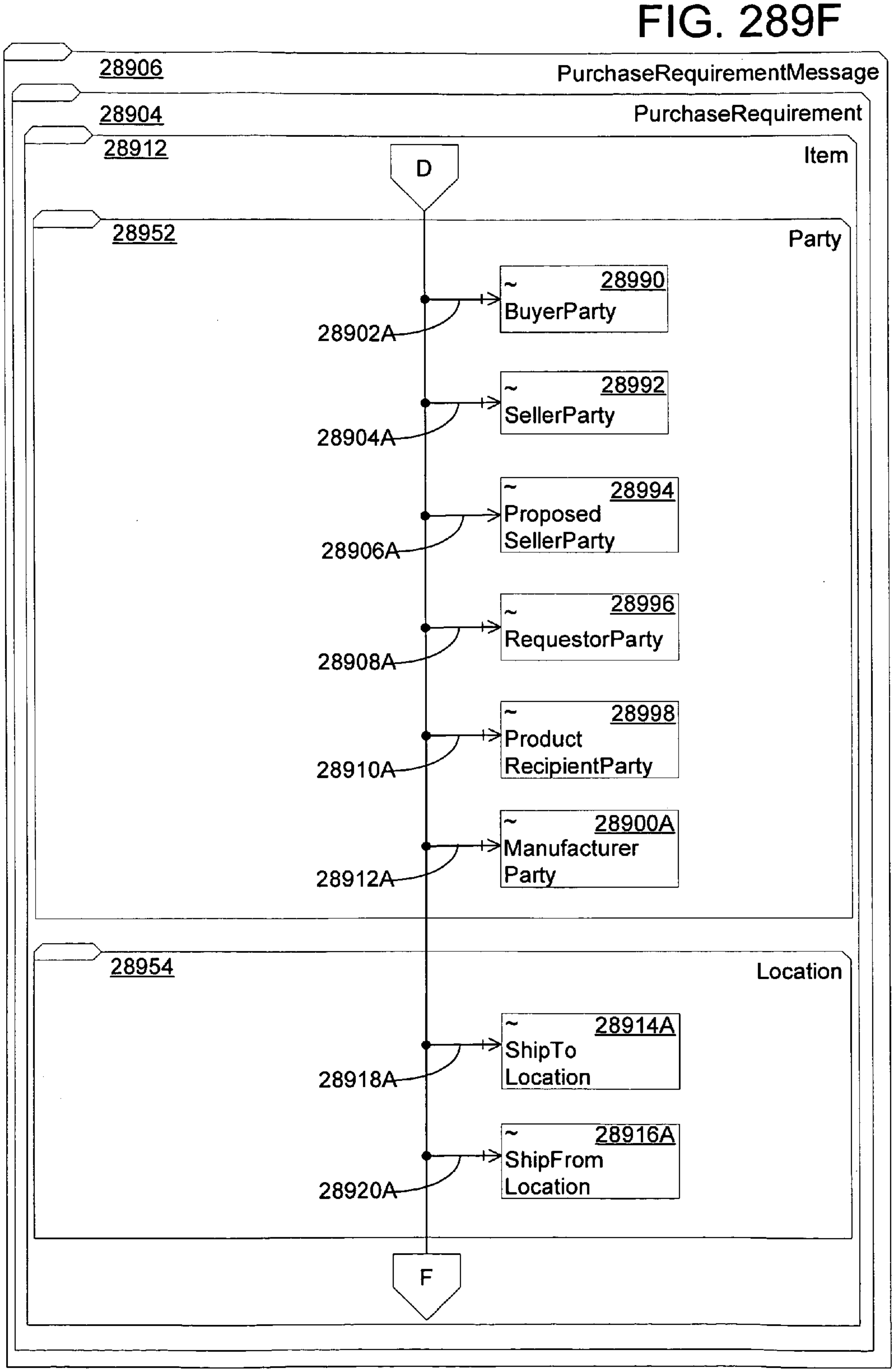
Figure 289G:
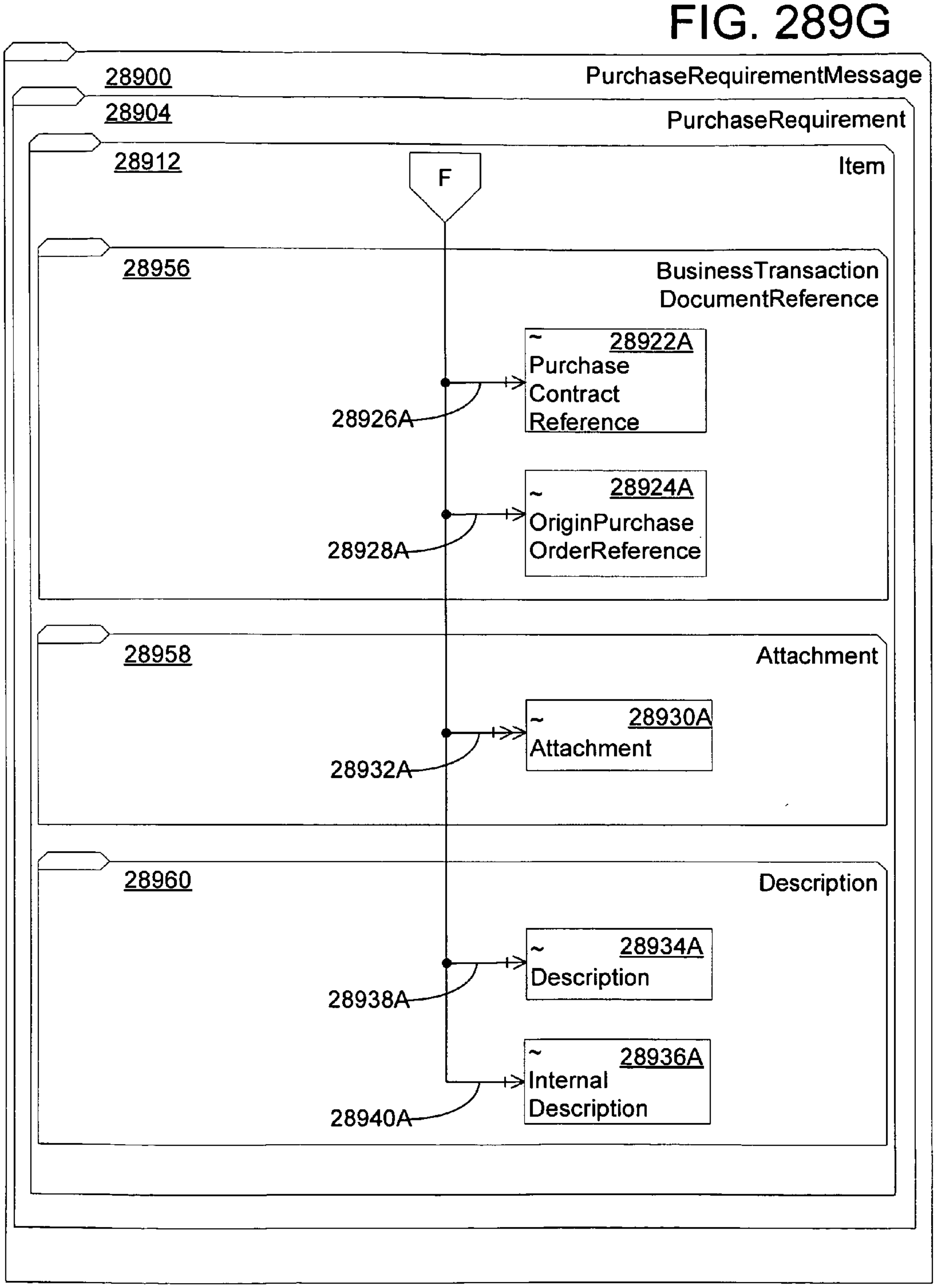
Figure 289H:
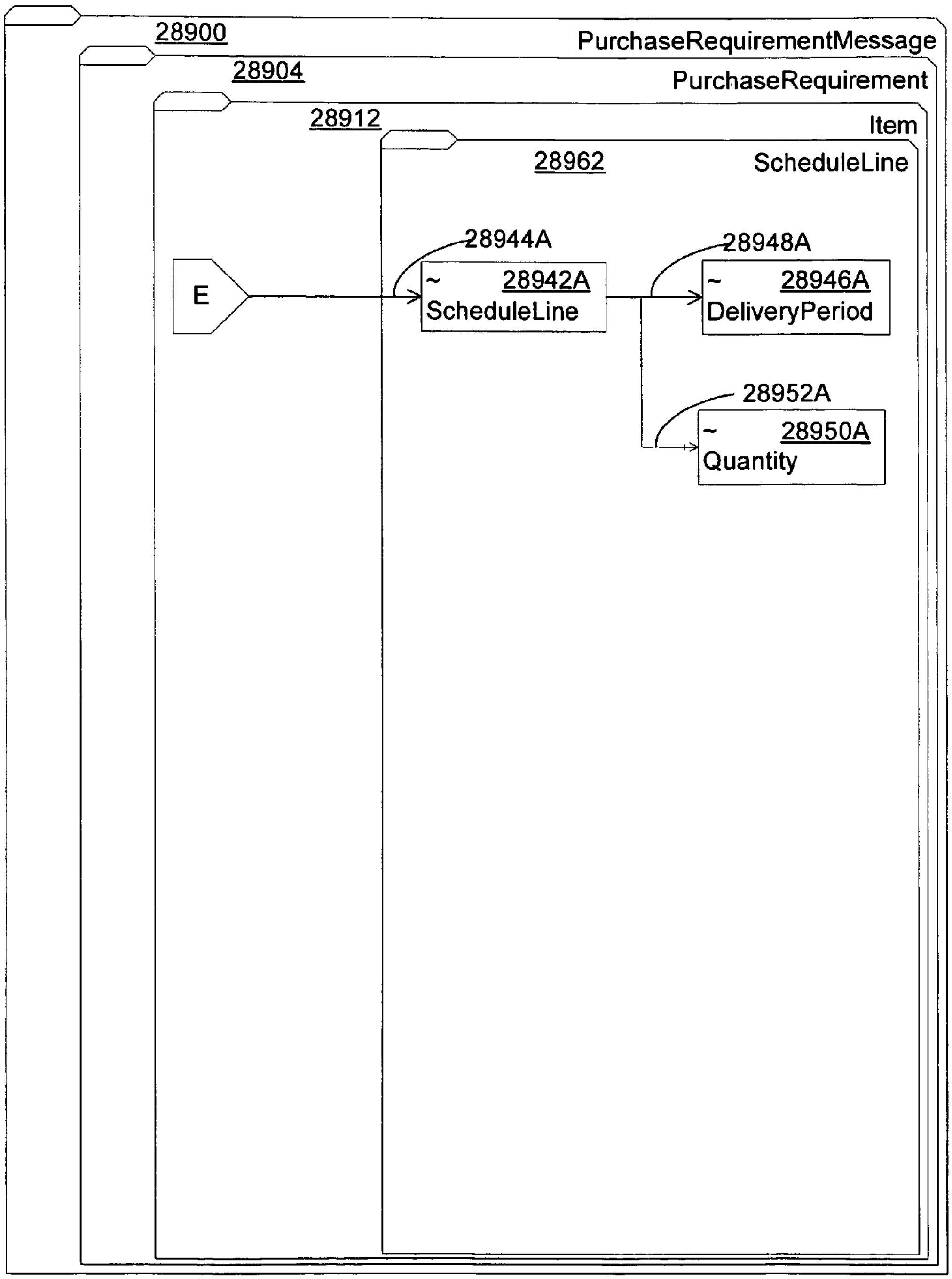

FIG. 288 depicts the message choreography for an exemplary purchase requisition process. The purchase requisition process uses purchase requirement interfaces to exchange purchase requisitions for products (such as materials and/or services) between a requester 28802 (such as, an MRP controller, for example in the PTS scenario) and a buyer 28804, and to exchange confirmations that these requisitions have been fulfilled. The buyer 28804 may then interface with a supplier 28806 for actual purchase of the requested products.

The requester 28802 starts the requisition process by sending a PurchaseRequirementRequest message 28808 to the buyer 28804. The PurchaseRequirementRequest message 28808 requests the buyer 28804 to fulfill a requisition generated by the requester 28802. The requisition system uses the PurchaseRequirementRequest message 28808 when requisitions are created or changed. The buyer 28804 uses the PurchaseRequirementConfirmation message 28810 to tell the requester 28802 the status of the requisition. For example, the PurchaseRequirementConfirmation message 28810 may indicate which follow-on documents for each item have been created and how much of the required quantity has been procured. The PurchaseRequirementConfirmation message 28810 may also include information regarding whether a requisition or partial quantity of a requisition can no longer be fulfilled.

The PurchaseRequirementConfirmation message 28810 may need to be communicated in specified circumstances. If the requirements-generating system manages the relevant follow-on documents itself or receives a copy of them and can carry out quantity offsetting in the requisition (as in the PTS scenario), the requirements-generating system requires the PurchaseRequirementConfirmation message 28810 if the requisition or a remaining quantity can no longer be procured. The procurement system sends the PurchaseRequirement-Confirmation message 28810 if a purchase requisition item has been changed (once a purchase order with reference to a requisition has been created or changed, for example). The current procurement status may be transferred in full with every PurchaseRequirementRequest message 28808.

(3) Message Data Type Purchase Requirement Message

FIG. 289 shows a data model for the Purchase Requirement Request. The message data type PurchaseRequirementMessage includes a PurchaseRequirementMessage package 28900 that groups together the business information relevant for sending a business document in a message and the PurchaseRequirement object in the business document. It includes a MessageHeader package 28902, a PurchaseRequirement package 28904, and a PurchaseRequirementMessage entity 28906.

The MessageHeader package 28902 groups together the business information relevant for sending a business document in a message. This package is typically not used and, therefore, typically remains empty.

The PurchaseRequirement package 28904 groups together a Party package 28908, a Location package 28910, an Item package 28912, and a PurchaseRequirement entity 28914. There is a 1:1 relationship between the PurchaseRequirementMessage entity 28906 and the PurchaseRequirement entity 28914.

A PurchaseRequirement entity 28914 is a requirement for procuring products (materials or services). The PurchaseRequirement entity 28914 is subdivided into PurchaseRequirementItems entities 28964 that each specify an ordered product or additional information relevant for such a product, such as information about product category or value limits. In addition to the buying party and the seller as well as the proposed seller, additional parties can be involved in the PurchaseRequirement. Locations can be specified for the PurchaseRequirement delivery. PurchaseRequirement entity 28914 is of type GDT: PurchaseRequirement.

The PurchaseRequirement entity 28914 includes an ID, a CreationDateTime, and a Note. The ID is a unique identifier assigned by the requisition system for the requisition. The ID is of type GDT: BusinessTransactionDocumentID. The CreationDateTime is the time at which the requisition was created in the requisition system. The CreationDateTime is of type GDT: DateTime. The Note is a short description/name for the requisition. The Note is of type GDT: Note.

(a) Purchase Requirement Party Package

Party package 28908 groups together the business parties involved in the PurchaseRequirement. It includes a BuyerParty entity 28916, a SellerParty entity 28918, a ProposedSellerParty entity 28920, a RequestorParty entity 28922, a ProductRecipientParty entity 28924, and a ManufacturerParty entity 28926. There is a 1:c relationship 28928 between the PurchaseRequirement entity 28914 and the BuyerParty entity 28916. There is a 1:c relationship 28930 between the PurchaseRequirement entity 28914 and the SellerParty entity 28918. There is a 1:c relationship 28932 between the PurchaseRequirement entity 28914 and the ProposedSellerParty entity 28920. There is a 1:c relationship 28934 between the PurchaseRequirement entity 28914 and the RequestorParty entity 28922. There is a 1:c relationship 28936 between the PurchaseRequirement entity 28914 and the ProductRecipientParty entity 28924. There is a 1:c relationship 28938 between the PurchaseRequirement entity 28914 and the ManufacturerParty entity 28926.

Either the ID or the ID and address can be transferred for each party. If the ID is transferred, the ID address defined in the master data is used. If the ID and address are transferred, the ID identifies the party and the address is deemed to be a document address that is different to the master data address. Where possible, the ID and address should be sent to avoid misunderstandings. The receiving application should implement a suitable optimization strategy to prevent many identical document addresses from being created.

A default logic is used for parties: from the header to the items and within item hierarchies. Parties specified in the header are valid for the items for which a corresponding party is not explicitly transferred and that are directly assigned to the header. In accordance with the same logic, parties transferred at item level are used for subitems assigned to the relevant item in an item hierarchy. The default logic applies for the party as a whole, including the contact person. Parts of a party specified at header level or for a hierarchy item cannot be specified in more detail at item level. The default logic is a simplified version of the transferred message. As regards logic, parties at header level and for hierarchy items behave as if they have been explicitly transferred for the subitems of the message.

(i) Buyer Party

A BuyerParty entity 28916 is a party that buys goods or services. The BuyerParty entity 28916 is of type GDT: BusinessTransactionDocumentParty, although it includes the StandardID and InternalID elements, as well as the Address and ContactPerson entities. The ContactPerson includes the InternalID element and the Address entity.

The BuyerParty is specified if more than one company processes its purchases in the recipient system (hosting scenario). In the other cases, the BuyerParty is unique and does not need to be specified. Changes can be made to the BuyerParty/Contact and a different BuyerParty/Contact can exist for each item. Changes can be made to the address of the BuyerParty, but different addresses are not permitted for each item. If the ShipToLocation, ShipToParty, and RequestorParty have not been explicitly specified in the requisition process, the address of the BuyerParty is used as the ship-to address.

(ii) Seller Party

A SellerParty entity 28918 is a party that sells goods or services. The SellerParty entity 28918 is of type GDT: BusinessTransactionDocumentParty, although it includes the StandardID and InternalID elements, as well as the Address and ContactPerson entities. The ContactPerson includes the InternalID element and the Address entity. If the SellerParty and ShipFromLocation have not been explicitly specified in the requisition process, the address of the SellerParty is used as the ship-from address. If the SellerParty is specified, it is used as the vendor when the requirement is generated in the procurement system (unlike the preferred vendor). The SellerParty is normally specified when the vendor was identified in the requirements system by a source of supply. In this case, the relevant source of supply is also specified in the corresponding BusinessTransactionDocumentReferencePackage entity.

(iii) Proposed Seller Party

A ProposedSellerParty entity 28920 is a preferred party for selling goods or services. The ProposedSellerParty entity 28920 is of type GDT: BusinessTransactionDocumentParty, although it includes the StandardID and InternalID elements, as well as the Address and ContactPerson entities. The ContactPerson includes the InternalID element and the Address entity. When a requisition is created, a user can specify a preferred vendor. In the procurement system, the professional buyer can use the preferred vendor as the actual vendor.

(iv) Requestor Party

A RequestorParty entity 28922 is a party that requests the procurement of goods or services. The RequestorParty entity 28922 is of type GDT: BusinessTransactionDocumentParty, although it includes the StandardID and InternalID elements, as well as the Address and ContactPerson entities. The ContactPerson includes the InternalID element and the Address entity. If a ShipToLocation and ProductRecipientParty are not explicitly specified in the requisition process, the RequestorParty address is used as the ship-to address. In the purchasing process, the RequestorParty (requester) carries out different follow-up actions. For this reason, it is specified explicitly (and not just as the Contact). In a SelfService process, the RequestorParty could enter and approve a goods receipt and invoice, for example.

(v) Product Recipient Party

A ProductRecipientParty entity 28924 is a party to which goods are delivered or for whom services are provided. The ProductRecipientParty entity 28924 is of type GDT: BusinessTransactionDocumentParty, although it includes the StandardID and InternalID elements, as well as the Address and ContactPerson entities. The ContactPerson includes the InternalID element and the Address entity. If a ShipToLocation is not specified explicitly in a requisition process, the address of the ProductRecipientParty is used as the delivery address. If the ProductRecipientParty (goods recipient) is not specified at item or header level, the RequestorParty is also used as the ProductRecipientParty. For a direct material item, the ProductRecipientParty is optional. The ShipToLocation, however, is mandatory. In the third-party process (see BusinessTransactionDocumentItemThirdPartyDealIndicator), the ProductRecipientParty is the customer. The ProductRecipientParty is not synonymous with the ShipToLocation and is to be used when the ProductRecipientParty (company or person) is actually different from the BuyerParty.

(vi) Manufacturer Party

A ManufacturerParty entity 28926 is a party that manufactures goods. The ManufacturerParty entity 28926 is of type GDT: BusinessTransactionDocumentParty, although it includes the StandardID and InternalID elements, as well as the Address and ContactPerson entities. The ContactPerson includes the InternalID element and the Address entity. The ManufacturerParty can be used for Material items with regard to the ManufacturerParty, the default logic (from header to item to subitems) is used for material items; for other items, the ManufacturerParty is ignored. The ManufacturerParty can be used to uniquely define the context of a ManufacturerProductID.

(b) Purchase Requirement Location Package

The Location package 28910 groups together the locations that are relevant for the requisition. The Location package 28910 includes a ShipToLocation entity 28940 and a ShipFromLocation entity 28942. There is a 1:c relationship 28944 between the PurchaseRequirement entity 28914 and the ShipToLocation entity 28940. There is a 1:c relationship 28946 between the PurchaseRequirement entity 28914 and the ShipFromLocation entity 28942.

A similar default logic to that used for Parties is also used for locations. Either the ID or the address, or both can be transferred for each location. If the ID is transferred, the ID address defined in the master data is used (if necessary, a new master record is created for the message recipient). If the address is transferred, it is this address that is used (if necessary, a location is assigned at the address recipient). If the ID and address are transferred, the ID identifies the location and the address is deemed to be a document address that is different to the master data address. Where possible, the ID and address should be sent to avoid misunderstandings. The receiving application should implement a suitable optimization strategy to prevent many identical document addresses from being created.

(i) Ship To Location

A ShipToLocation entity 28940 is the location to which goods are to be delivered or where services are to be provided. The ShipToLocation entity 28940 is of type GDT: BusinessTransactionDocumentLocation, although it includes the StandardID and InternalID elements, as well as the Address entity. In a direct material item, the ShipToLocation ID is specified.

(ii) Ship From Location

A ShipFromLocation entity 28942 is the location from where goods are to be shipped. The ShipFromLocation entity 28942 is of type GDT: BusinessTransactionDocumentLocation, although it includes the StandardID and InternalID elements, as well as the Address entity. The ShipFromLocation can be used for material items the default logic from header to item to subitems is used for the ShipFromLocation for material items; for the other items, the ShipFromLocation is ignored.

(c) Purchase Requirement Package

A PurchaseRequirementItem package 28912 includes a ProductInformation package 28948, a PriceInformation package 28950, a Party package 25952, a Location package 28954, a BusinessTransactionDocumentReference package 28956, an Attachment package 28958, a Description package 28960, a ScheduleLine package 28962, and a PurchaseRequirementItem (or Item) entity 28964. There is a 1:n relationship 28966 between the PurchaseRequirement entity 28914 and the Item entity 28964. PurchaseRequirementItem entities 28964 are arranged hierarchically using a HierarchyRelationship 28968. The HierarchyRelationship 28968 is the relationship between a sub-item and a higher-level parent item in an item hierarchy. There is a 1:cn relationship 28970 between the Item entity 28964 and its subordinate entities. There is a 1:c relationship 28972 between the Item entity 28964 and its superordinate entities.

(i) Purchase Requirement Item

A PurchaseRequirementItem entity 28964 specifies a product requested by the PurchaseRequirement or provides additional information about such a product. The PurchaseRequirementItem entity 28964 includes detailed information about a particular product (see ProductInformation package 28948) and its price (see PriceInformation package 28950). The quantity of the product and (delivery) dates/times are specified in the schedule line (see ScheduleLine package). For the PurchaseRequirementItem entity 28964 (compared to the information of the PurchaseRequirement entity 28914), deviating parties or locations can be defined (see Party package 28952 and Location package 28954). The PurchaseRequirementItem entity 28964 can contain references to other business documents that are relevant for the item (see BusinessTransactionDocumentReference package 28956). Notes or references to attachments can also be specified for the item (see Description package 28960 and Attachment package 28958). A PurchaseRequirementItem entity 28964 can be subordinate to another PurchaseRequirementItem entity 28964 within a hierarchy to represent a business relationship between the two items. This could be information about a substitute product for an ordered product, for example. This relationship can also be used to group together PurchaseRequirement items, that is, a PurchaseRequirementItem can group together other PurchaseRequirementItems. The PurchaseRequirementItem entity 28964 is of type GDT: PurchaseRequirementItem.

The PurchaseRequirementItem entity 28964 includes an ID, a ThirdPartyDealIndicator, and a DirectMaterialIndicator. The ID is the requisition item number; a unique identifier assigned by the requester for the purchase requisition item. The ID is of type GDT: BusinessTransactionDocumentItemID. The ThirdPartyDealIndicator specifies that the purchase requisition item is used as part of a third-party process. The ThirdPartyDealIndicator is of type GDT: BusinessTransactionDocumentItemThirdPartyDealIndicator. The DirectMaterialIndicator specifies whether the material in the purchase requisition item is used as part of a direct material process. The DirectMaterialIndicator is of type GDT: DirectMaterialIndicator.

From a semantic point of view, items can contain other items. Item hierarchies are mapped in this way. From a technical point of view, the item type is not defined recursively, since this cannot be handled by some commonly-used XML tools. The hierarchies are mapped using the entity HierarchyRelationship. There are various item categories, which are governed by a variety of constraints. An item can have several constraint types. In this case, the item satisfies the constraints of its constraint types. Which constraint types can be combined with one another and how, is specified in the description of the constraint types. The following constraint types exist:

(1) Standard items are the items to which no lower-level items have been assigned in the hierarchy. An item that is not referenced by the ParentItemID of another item is a standard item.

(2) Hierarchy items are items to which at least one other lower-level item has been assigned in the hierarchy. An item that is referenced by the ParentItemID of at least one other item is a hierarchy item. Items are either standard or hierarchy items.

(3) Subitems are items that are assigned below a hierarchy item and not directly assigned to the requisition header. Subitems can be both standard items and hierarchy items. Each item that references another item by the ParentItemID is a subitem.

(4) Material items are items whose product is a material. Items whose ProductTypeCode is "1" (Material) are Material items.

(5) DirectMaterial items are material items that are used as part of a direct material process (see DirectMaterialIndicator).

(6) Service items are items whose product is a service. Items whose ProductTypeCode is "2" (service) are service items.

(7) Limit items are items with a cost limit. Limit items are used as placeholders in a requisition if the exact requirements are unknown at the time the requisition is issued. This can be the case for repairs, where the time and spare parts required are not known until the repair has been made.

(8) Grouping hierarchy items are hierarchy items that logically group together other items. Multilevel grouping hierarchies are permitted, that is, a grouping hierarchy item can contain subitems that are also grouping hierarchy items. Hierarchy items whose subitems have HierarchyRelationshipTypeCode "002" (group) are grouping hierarchy items; subitems with a different HierarchyRelationshipTypeCode are not permitted. Grouping hierarchy items are not permitted as subitems of other types of hierarchy items.

(9) BOM hierarchy items are hierarchy items that group together other items in a BOM. Multilevel BOM hierarchies are permitted. Hierarchy items with at least one subitem with HierarchyRelationshipTypeCode "001" (bill of material) are BOM hierarchy items; additional subitems are permitted with the HierarchyRelationshipTypeCode "003" (discount in kind).

(10) Discount in kind hierarchy items are hierarchy items for which a goods discount is granted in the form of an inclusive or exclusive bonus quantity. Multilevel discount in kind hierarchies are not permitted, that is, no discount in kind can be granted for discount in kind. The goods discount is described in the form of one or more subitems in the discount in kind hierarchy item. Hierarchy items with at least one subitem with HierarchyRelationshipTypeCode "003" (discount in kind) are discount in kind hierarchy items; additional subitems are permitted with the HierarchyRelationshipTypeCode "001" (bill of material). Hierarchy items are grouping, BOM, or discount in kind hierarchy items. A hierarchy item can be both BOM and a discount in kind hierarchy item, if a discount in kind has been granted for a BOM.

(ii) Hierarchy Relationship

A HierarchyRelationship is the relationship between a subitem and a higher-level parent item in an item hierarchy. The HierarchyRelationship includes a ParentItemID and a TypeCode. The ParentItemID is a reference to a parent item. The ParentItemID is of type GDT: BusinessTransactionDocumentItemID. The TypeCode represents the hierarchical relationship between the subitem and its higher-level parent item. The TypeCode is of type GDT: BusinessTransactionDocumentItemHierarchyRelationshipTypeCode.

The ParentItemID is not changed once an item has been created. The TypeCode is not changed once an item has been created.

(iii) Purchase Requirement Item Product Information Package

A ProductInformation package 28948 groups together the information for identifying, describing, and classifying a product in a purchase requisition item. It includes a Product entity 28974 and a ProductCategory entity 28976. There is a 1:c relationship 28978 between the Item entity 28964 and the Product entity 28974. There is a 1:c relationship 28980 between the Item entity 28964 and the ProductCategory entity 28976. The ProductInformation package 28948 is not used in grouping hierarchy items.

(a) Product

A Product entity 28974 includes the details about a product as generally understood from a commercial point of view in business documents. These are the details for identifying a product and product type, and the description of the product. The Product entity 28974 is of type GDT: BusinessTransactionDocumentProduct, although it includes the StandardID, InternalID, TypeCode, and Note elements.

For limit items, the description (note) can be used in the Product entity 28974; the product number and ProductTypeCode are not used. Except in limit items, either a product number or a description along with the ProductTypeCode (material or service) is always specified. The ProductTypeCode is not changed once an item has been created. With the exception of grouping hierarchy items, at least the product number or the product description (Note) is specified when a new item is created. If both the product number and description are specified, the description is merely additional information in the message and can be ignored by the recipient. In substitution product subitems, the ProductTypeCode does not differ from the parent item ProductTypeCode.

(b) Product Category

A ProductCategory entity 28976 includes the details about a product category as generally understood from a commercial point of view in business transaction documents. It includes details for identifying the product category using an internal ID, a standard ID, and IDs assigned by involved parties. The ProductCategory entity 28976 is of type GDT: BusinessTransactionDocumentProductCategory, although it includes the StandardID and InternalID elements. The product category is derived directly from the product if a product number is specified for the product.

(iv) Purchase Requirement Item Price Information Package

A PriceInformation package 28950 groups together price-relevant information. It includes a Price entity 28982 and a ProcurementCostUpperLimit entity 28984. There is a 1:c relationship 28986 between the Item entity 28964 and the Price entity 28982. There is a 1:c relationship 28988 between the Item entity 28964 and the ProcurementCostUpperLimit entity 28984. The Price package for a purchase requisition item includes prices; it does not contain any information about how the prices are calculated (pricing scales, and so on).

(a) Price

A Price entity 28982 is the purchase order price specified by the requester or buyer. The Price entity 28982 includes a NetUnitPrice, which is the net price (without tax or cash discount) specified by the buyer for the base quantity of the service or material. The NetUnitPrice is of type GDT: Price.

In BOM hierarchies, the following rules apply for the Price entity 28982: (1) if the price is specified for the item at the top of the BOM hierarchy and not the subitems, this price applies; (2) if the price is specified for standard items (end nodes in the hierarchy tree) in the BOM hierarchy, these prices apply. The price of the entire BOM is the total of the individual prices; and (3) if a price is specified at different levels in the BOM hierarchy, the price that appears above the others in the tree always applies. Differences between the total of the individual prices and the price at the next highest hierarchy level are permissible. These may be caused by discounts for the entire BOM.

(b) Procurement Cost Upper Limit

A ProcurementCostUpperLimit entity 28984 is the cost upper limit for different types of procurement costs. The ProcurementCostUpperLimit entity 28984 is of type GDT: ProcurementCostUpperLimit. If a limit is specified, this implies that the purchase requisition item is a limit item; in other words, the requisition item indicates a requirement for a certain quantity of a particular product or service within a certain period. Limit items are used as placeholders in a requisition if the exact requirements are unknown at the time the requisition is issued. This can be the case for repairs, where the time and spare parts required are not known until the repair has been made.

(v) Purchase Requirement Item Party Package

The ItemParty package 28952 is similar to the Party package 28908 in the PurchaseRequirement package 28904. The ItemParty package 28952 also includes a BuyerParty entity 28990, a SellerParty entity 28992, a ProposedSellerParty entity 28994, a RequestorParty entity 28996, a ProductRecipientParty entity 28998, and a ManufacturerParty entity 28900A. There is a 1:c relationship 28902A between the Item entity 28964 and the BuyerParty entity 28990. There is a 1:c relationship 28904A between the Item entity 28964 and the SellerParty entity 28992. There is a 1:c relationship 28906A between the Item entity 28964 and the ProposedSellerParty entity 28994. There is a 1:c relationship 28908A between the Item entity 28964 and the RequestorParty entity 28996. There is a 1:c relationship 28910A between the Item entity 28964 nd the ProductRecipientParty entity 28998. There is a 1:c relationship 28912A between the Item entity 28964 and the ManufacturerParty entity 28900A.

(vi) Purchase Requirement Item Location Package

The ItemLocation package 28954 is similar to the Location package 28910 in the PurchaseRequirement package 28904. The ItemLocation package 28954 also includes a ShipToLocation entity 28914A and a ShipFromLocation entity 28916A. There is a 1:c relationship 28918A between the Item entity 28964 and the ShipToLocation entity 28914A. There is a 1:c relationship 28920A between the Item entity 28964 and the ShipFromLocation entity 28916A.

(vii) Purchase Requirement Item Business Transaction Document Reference Package

A BusinessTransactionDocumentReference package 28956 groups together references to business documents that are relevant for the PurchaseRequirementItem and have a business relationship with the item. It includes a PurchaseContractReference entity 28922A and an OriginPurchaseOrderReference entity 28924A. None of the entities in the BusinessTransactionDocumentReference package 28956 can be used in grouping hierarchy items.

If possible, individual items in business documents should be referenced in the requisition message from item level (contract item 10 is directly referenced from purchase requisition item 1, for example). If an item assignment is not recognized, an entire document can be referenced (contract 4711 is referenced in its entirety from purchase requisition item 1, for example). In this case, the recipient cannot demand that the item numbers in both documents be the same (that item 1 in requisition 4712 be the same as item 1 in contract 4711, for example). It is the responsibility of the recipient to try this assignment using other criteria that are not necessarily unique, such as the product number.

(a) Purchase Contract Reference

A PurchaseContractReference entity 28922A is a reference to a purchase contract or item in a purchase contract. The PurchaseContractReference entity 28922A is of type GDT: BusinessTransactionDocumentReference.

Contract references are not permitted in limit items; these are included in the ProcurementCostUpperLimit entity. A PurchaseContractReference entity 28922A can reference one item, that is, one ItemID is permissible.

(b) Origin Purchase Order Reference

The OriginPurchaseOrderReference entity 28924A is a reference to the origin purchase order or to an item within the origin purchase order in a third-party process. The OriginPurchaseOrderReference entity 28924A is of type GDT: BusinessTransactionDocumentReference.

The OriginPurchaseOrderReference entity 28924A can reference one item, that is, one ItemID is permissible. The OriginPurchaseOrderReference entity 28924A is used for third-party purchase orders.

The OriginPurchaseOrderReference entity 28924A is passed on to the purchase orders in a third-party deal, so that the seller can reference the original purchase order of the ShipToParty with the OriginPurchaseOrderReference.

(viii) Purchase Requirement Item Attachment Package

The Attachment package 28958 groups together the relevant attachments with reference to the purchase requisition item. It includes an AttachmentWebAddress entity 28930A.

There is a 1:cn relationship 28932A between the Item entity 28964 and the AttachmentWebAddress entity 28930A.

The AttachmentWebAddress entity 28930A is a Web address for a document of any type that is related to the transmitted message or a part of the message, but is not itself transferred as part of the message. The AttachmentWebAddress entity 28930A is of type GDT: AttachmentWebAddress.

(ix) Purchase Requirement Item Description Package

A Description package 28960 groups together the texts relating to the purchase requisition item. It includes a Description entity 28934A and an InternalDescription entity 28936A.

The Description entity 28934A is a natural-language text regarding the purchase requisition item, which is visible to the parties. The Description entity 28934A is of type GDT: Description. The Description entity 28934A can be used for the textual information about the transferred requisition and not just the current message. An example of this would be information that the Purchasing employee responsible is on vacation as of a specific date, and indicating the name and telephone number of a substitute as of this date.

An InternalDescription entity 28936A is a natural-language text regarding the purchase requisition item, which is visible to the parties within the company. The InternalDescription entity 28936A is of type GDT: Description. The InternalDescription entity 28936A can be used for the textual information about the transferred requisition and not just the current message. An example of this is a note indicating that the requisition is required for a particular internal purpose. Unlike the Description, the InternalDescription is not included in a message that would be sent to the vendor.

(x) Purchase Requirement Item Schedule Line Package

A ScheduleLine package 28962 groups the quantity and date information about a PurchaseRequirementItem entity 28964. The ScheduleLine package 28962 includes a ScheduleLine entity 28942A. There is a 1:1 relationship 28944A between the Item entity 28964 and the ScheduleLine entity 28942A.

A ScheduleLine entity 28942A is a line containing the quantity and dates of the performance period requested in a requisition. The ScheduleLine entity 28942A includes a DeliveryPeriod 28946A and a Quantity 28950A. The DeliveryPeriod is the period in which the requester expects a product to be delivered or service provided. The DeliveryPeriod is of type GDT: DateTimePeriod. The Quantity is the required quantity. The Quantity is of type GDT: Quantity. The quantity is specified, unless the item in question is a limit item, in which case it can be left empty. Exactly one ScheduleLine is provided in the PurchaseRequirementItem.

(4) Message Data Type Element Structure

FIG. 290 depicts the element structure for PurchaseRequirementRequest. The element structure identifies the different packages 29000 in the interface, and represents the entities at various levels within the interface. As shown in FIG. 290, the interface for PurchaseRequirementRequest includes five levels 29002, 29004, 29006, 29008, 29010. The element structure identifies the number of occurrences 29012 of each element and provides a Datatype name 29014 for each element.

The outermost package of this interface is PurchaseRequirementMessage package 29016, which includes a PurchaseRequirementMessage entity 29018 at the first level 29002. The PurchaseRequirementMessage entity 29018 is of data type MDT: PurchaseRequirementMessage 29020.

The PurchaseRequirementMessage package 29016 includes a PurchaseRequirement package 29022, which includes a PurchaseRequirement entity 29024. The PurchaseRequirement entity 29024 has one occurrence 29026 and is of data type PurchaseRequirement 29028.

The PurchaseRequirement entity 29024 includes an ID 29030, a CreationDateTime 29036 and a Note 29042. The ID 29030 has one occurrence 29032 and is of data type BusinessTransactionDocumentID 29034. The CreationDateTime 29036 has one occurrence 29038 and is of data type DateTime 29040. The Note 29042 has one or zero occurrences 29044 and is of data type Note 29046.

The PurchaseRequirement entity 29024 also includes a Party package 29048, a Location package 29050, and an Item package 29052. The Party package 29048 includes a BuyerParty entity 29054, a SellerParty entity 29096, a ProposedSellerParty entity 29002A, a RequestorParty entity 29008A, a ShipToParty entity 29014A, and a ManufacturerParty entity 29020A.

The BuyerParty entity 29054 has one or zero occurrences 29056 and is of data type BusinessTransactionDocumentParty 29058. The BuyerParty entity 29054 also includes a StandardID 29060, an InternalID 29066, an Address 29072, and a ContactPerson 29078.

The StandardID 29060 of the BuyerParty entity 29054 has zero or n occurrences 29062 and having a data type of PartyStandardID 29064. The InternalID 29066 has zero or one occurrences 29068 and a data type of PartyStandardID 29070. The Address 29072 has zero or one occurrences 29074 and a data type of Address 29076. The ContactPerson 29078 also includes an InternalID 29084 and an Address 29090. The InternalID 29084 of the ContactPerson 29078 has zero or n occurrences 29086 and a data type of ContactPersonID 29088. The Address 29090 of the ContactPerson 29078 has one or zero occurrences 29092 and a data type of Address 29094.

The SellerParty 29096 of the PurchaseRequirement entity 29024 has one or zero occurrences 29098 and a data type of BusinessTransactionDocumentParty 29000A. The ProposedSellerParty 29002A has one or zero occurrences 29004A and a data type of BusinessTransactionDocumentParty 29006A. The RequestorParty 29008A has one or zero occurrences 29010A and a data type of BusinessTransactionDocumentParty 29012A. The ShipToParty 29014A has one or zero occurrences 29016A and a data type of BusinessTransactionDocumentParty 29018A. The ManufacturerParty 29020A has one or zero occurrences 29022A and a data type of BusinessTransactionDocumentParty 29024A.

The Location package 29050 includes a ShipToLocation entity 29026A and a ShipFromLocation entity 29050A. The ShipToLocation entity 29026A has zero or one occurrences 29028A with a data type of BusinessTransactionDocumentLocation 29030A. The ShipToLocation entity 29026A also includes a StandardID 29032A, an InternalID 29038A and an Address 29044A. The StandardID 29032A has zero or one occurrences 29034A with a data type of LocationStandardID 29036A. The InternalID 29038A has zero or one occurrences 29040A with a data type of LocationStandardID 29042A. The Address 29044A has zero or one occurrences 29046A with a data type of Address 29048A. The ShipFromLocation entity 29050A has zero or one occurrences 29052A with a data type of BusinessTransactionDocumentLocation 29054A.

The Item package 29052 of the PurchaseRequirement entity 29024 includes a Product package 29096A, a Price package 29098A, a Party package 29000B, a Location package 29002B, a BusinessTransactionDocumentReference package 29004B, an Attachment package 29006B, a Description package 29008B, and a ScheduleLine package 29010B.

The Item entity 29056A has a one or n occurrences 29058A with a data type of PurchaseRequirementItem 29060A.

The Item package 29052 also includes an Item entity 29056A, which includes an ID 29062A, a ThirdPartyDealIndicator 29068A, a DirectMaterialIndicator 29074A, and a HierarchyRelationship 29080A. The ID 29062A has one occurrence 29064A with a data type of BusinessTransactionDocumentItemID 29066A. The ThirdPartyDealIndicator 29068A has one or zero occurrences 29070A with a data type of BusinessTransactionDocumentItemThirdPartyDealIndicator 29072A. The DirectMaterialIndicator 29074A has a zero or one occurrence 29076A with a data type of DirectMaterialIndicator 29078A. The HierarchyRelationship 29080A includes a ParentItemID 29084A and a TypeCode 29090A. The HierarchyRelationship 29080A has a zero or one occurrence 29082A. The ParentItemID 29084A has one occurrence 29086A with a data type of BusinessTransactionDocumentItemID 29088A. The TypeCode 29090A has one occurrence 29092A with a data type of BusinessTransactionDocumentItemHierarchyRelationshipTypeCode 29094A.

The Product Package 29096A includes a Product entity 29012B and a ProductCategory entity 29042B. The Product entity 29012B has one or zero occurrences 29014B with a data type of BusinessTransactionDocumentProduct 29016B. The Product entity 29012B also includes a StandardID 29018B, an InternalID 29024B, a TypeCode 29030B, and a Note 29036B. The StandardID 29018B has one or n occurrences 29020B with a data type of ProductStandardID 29022B. The InternalID 29024B has zero or one occurrences 29026B with a data type of ProductInternalID 29028B. The TypeCode 29030B has zero or one occurrences 29032B with a data type of ProductTypeCode 29034B. The Note 29036B has zero or one occurrences 29038B with a data type of Note 29040B.

The ProductCategory entity 29042B has zero or one occurrences 29044B with a data type of BusinessTransactionDocumentProductCategory 29046B. The ProductCategory entity 29042B also has a StandardID 29048B and an InternalID 29054B. The StandardID 29048B has zero or n occurrences 29050B with a data type of ProductCategoryStandardID 29052B. The InternalID 29054B has zero or n occurrences 29056B with a data type of ProductCategoryInternalID 29058B.

The Product package 29096A also includes a Price package 29098A, a Party package 29000B, a Location package 29002B, a BusinessTransactionDocumentReference package 29004B, an Attachment package 29006B, a Description package 29008B and a ScheduleLine package 29010B.

The Price package 29098A has one or zero occurrences 29062B and includes a NetUnitPrice 29064B. The NetUnitPrice 29064B has one or zero occurrences 29066B with a data type of Price 29068B. The Price package 29098A also includes a ProcurementCostUpperLimit entity 29070B having zero or one occurrences 29072B and a data type of ProcurementUpperLimit 29074B.

The Party package 29000B includes a BuyerParty 29076B, a SellerParty 29082B, a ProposedSellerParty 29088B, a RequestorParty 29094B, a ShipToParty 29000C and a Manufacturer 29006C. The BuyerParty 29076B has a one or zero occurrences 29078B with a data type of BusinessTransactionDocumentParty 29080B. The SellerParty 29082B has zero or one occurrences 29084B with a data type of BusinessTransactionDocument Party 29086B. The ProposedSellerParty 29088B has zero or one occurrences 29090B with a data type of BusinessTransactionDocumentParty 29092B. The RequestorParty 29094B has one or zero occurrences 29096B with a data type of BusinessTransactionDocumentParty 29098B. The ShipToParty 29000C has a zero or one occurrences 29002C with a data type of BusinessTransactionDocumentParty 29004C. The Manufacturer 29006C has zero or one occurrences 29008C with a data type of BusinessTransactionDocumentParty 29010C.

The Location package 29002B includes a ShipFromLocation entity 29012C and a ShipToLocation entity 29018C. The ShipFromLocation entity 29012C has one or zero occurrences 29014C with a data type of BusinessTransactionDocumentLocation 29016C. The ShipToLocation 29018C has one or zero occurrences 29020C with a data type of BusinessTransactionDocumentLocation 29022C.

The BusinessTransactionDocumentReference package 29004B includes a PurchaseContractReference entity 29024C and an OriginPurchaseOrderReference entity 29030C. The PurchaseContractReference entity 29024C has zero or one occurrence 29026C with a data type of BusinessTransactionDocumentReference 29028C. The OriginPurchaseOrderReference entity 29030C has one or zero occurrences 29032C with a data type of BusinessTransactionDocumentReference 29034C.

The Attachment package 29006B has an AttachmentWebAddress entity 29036C having one or zero occurrences 29038C with a data type of AttachmentWebAddress 29040C.

The Description package 29008B has a Description entity 29042C and an InternalDescription entity 29048C. The Description entity 29042C has zero or one occurrences 29044C with a data type of Description 29046C. The InternalDescription entity 29048C has zero or one occurrences 29050C with a data type of Description 29052C.

The ScheduleLine package 29010B includes a ScheduleLine entity 29054C having a DeliveryPeriod 29058C and a Quantity 29064C. The ScheduleLine entity 29054C has one occurrence 29056C. The DeliveryPeriod 29058C has one occurrence 29060C with a data type of DateTimePeriod 29062C. The Quantity 29064C has zero or one occurrences 29066C with a data type of Quantity 29068C.

b) Source of Supply Notification Interface

A SourceOfSupplyNotification is a message sent to supply planning (Supply Chain Planning) about the available sources of supply. The motivating business scenario for the source of supply notification is the Procure to Stock (PTS) scenario. Once a purchase contract has been released in Supplier Relationship Management (SRM), a message with sources of supply resulting from the purchase contract data is sent to Supply Chain Planning (SCP) so that it can be taken into account during sourcing.

A SourceOfSupplyNotification is a message sent to SCP about the available sources of supply. The message type SourceOfSupplyNotification is based on the message data type SourceOfSupplyMessage. Information about sources of supply and changes to sources of supply is sent in its entirety (CompleteTransmission).

(1) Message Choreography

Figure 291:
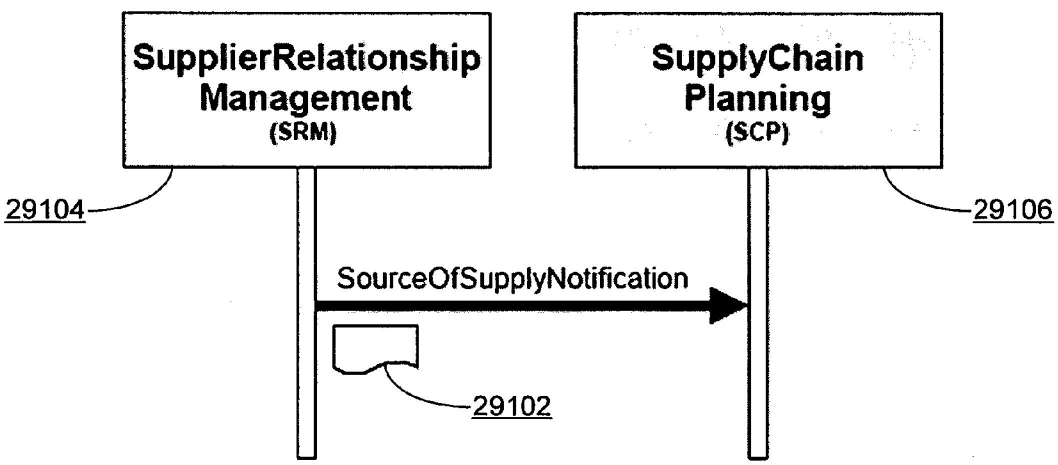
FIG. 291 depicts the message choreography for the Source of Supply interface in accordance with methods and systems consistent with the present invention.

FIG. 291 depicts a graphical representation 29100 of a Source Of Supply Notification 29102 between two business entities in accordance with methods and systems consistent with the present invention. In the implementation shown in FIG. 291, the first business entity is a supply source manager (or Supplier Relationship Management 29104) and the second business entity is a supply planner (or Supply Chain Planning 29106). The Source Of Supply Notification 29102 is a message sent from the Supplier Relationship Management 29104 to Supply Chain Planning 29106 about the available sources of supply. The Source of Supply Notification 29102 may identify a Procure to Stock (PTS) scenario to the Supply Chain Planning 29106. For example, once a purchase contract (not shown in FIG. 291) has been released in or to Supplier Relationship Management 29104, a message 29102 with sources of supply resulting from the purchase contract data is sent to Supply Chain Planning 29106 so that Supply Chain Planning 29106 is able to take into account the sources of supply during the stocking or sourcing process. In this implementation, the Source Of Supply Notification 29102 is sent once a purchase contract has been released.

Figure 292A:
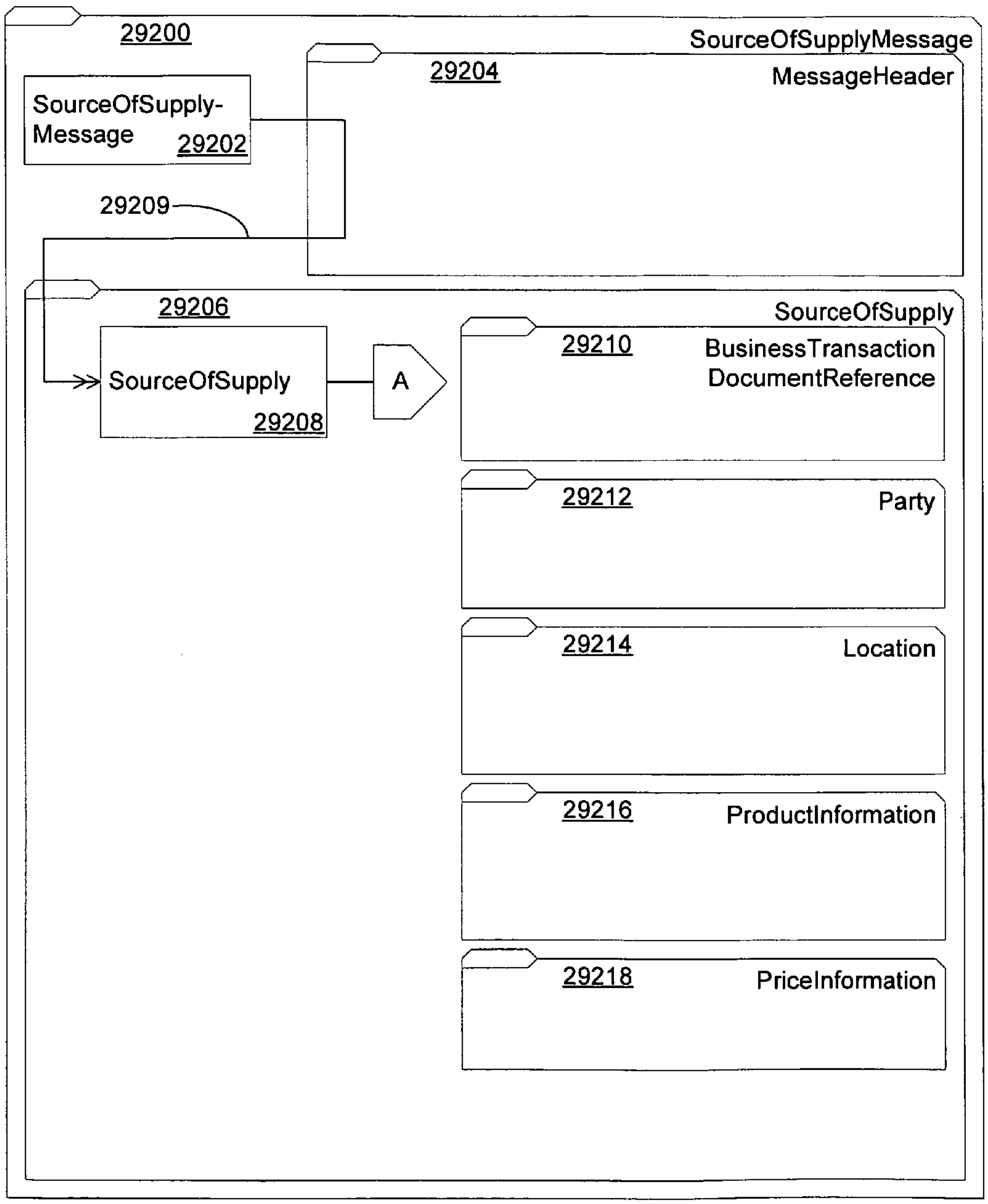
FIGS. 292A-C depict the data model for the Source of Supply interface in accordance with methods and systems consistent with the present invention.
Figure 292B:
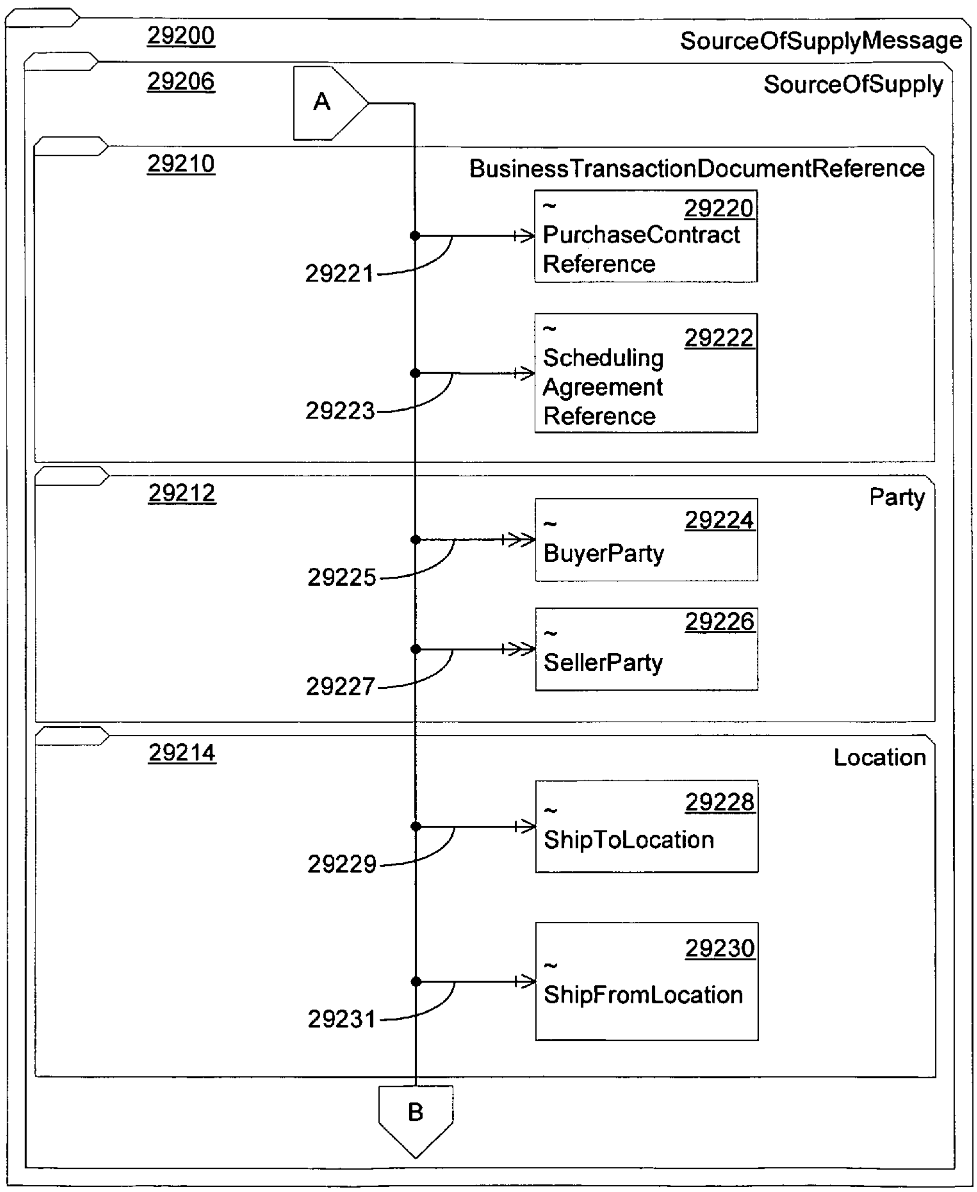
Figure 292C:
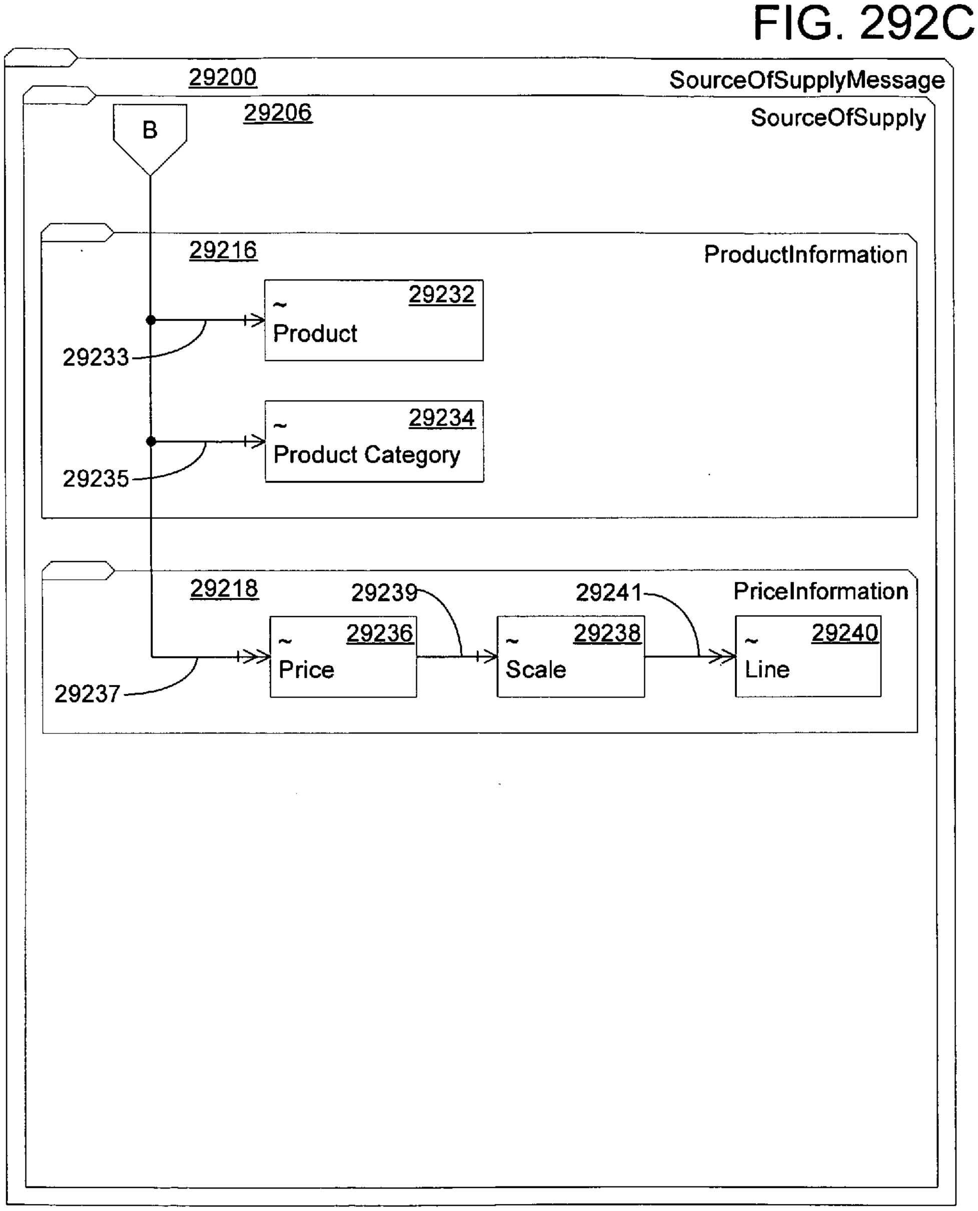

The Source Of Supply Notification 29102 is a message type based on the message data type SourceOfSupplyMessage 29200 shown in FIG. 292. A message based on the message data type SourceOfSupplyMessage 29200 is implemented by two message operations: a SourceOfSupplyNotification_Out operation and a SourceOfSupplyNotification_In operation. The SourceOfSupplyNotification_Out operation is in Supplier Relationship Management 29104, and the SourceOfSupplyNotification_In operation is in Supply Chain Planning 29106.

(2) Message Data Type Source of Supply Message

The message data type SourceOfSupplyMessage 29200 includes the SourceOfSupply Message entity 29202 in the business document or the business information that is relevant for sending a business document in a message. As shown in FIG. 292, the message data type SourceOfSupplyMessage 29200 includes a MessageHeader package 29204 and a SourceOfSupply package 29206. The message data type SourceOfSupplyMessage 29200 provides the structure for the message type SourceOfSupplyNotification 29102.

(a) Message Header package

A MessageHeader package 29204 groups the business information that is relevant for sending a business document in a message. In one implementation, the MessageHeader package 29204 may not be relevant for implementing the SourceOfSupplyNotification 29102.

(b) Source of Supply Package

The SourceOfSupply package 29206 groups information about one or more sources of supply, and includes a SourceOfSupply entity 29208, a BusinessTransactionDocumentReference package 29210, a Party package 29212, a Location package 29214, a ProductInformation package 29216, and a PriceInformation package 29218. There is a 1:n relationship 29209 between the SourceOfSupplyMessage object 29202 and the SourceOfSupply entity 29208.

The SourceOfSupply entity 29208 identifies the procurement option for a particular product or product category. In particular, the SourceOfSupply entity 29208 includes information about prices and ship-to/ship-from locations. The SourceOfSupply 29208 is of type GDT: SourceOfSupply.

As discussed in further detail below, the SourceOfSupply entity 29208 includes an ActiveIndicator, a DeletedIndicator, a SourcingPriorityCode, a ValidityPeriod, a TargetQuantity, a TargetAmount, a GoodsReceiptProcessingDuration, and a PlannedDeliveryDuration. The ActiveIndicator indicates whether a source of supply may be used for supply planning, and is of type GDT: ActiveIndicator. The DeletedIndicator indicates whether or not a source of supply is logically deleted, and is of type GDT: DeletedIndicator. The SourcingPriorityCode indicates the priority of a source of supply during sourcing. The sourcing priority may be defined in the purchase contract so that, for example, reference sources of supply may be determined. The SourcingPriorityCode is of type GDT: BusinessTransactionPriorityCode. The ValidityPeriod indicates the period in which a source of supply is valid, and is of type GDT: DateTimePeriod. The TargetQuantity identifies the notified total quantity of a product. The Buyer and Seller agreed upon this quantity as part of a purchase contract for a source of supply. The TargetQuantity is of type GDT: Quantity. The TargetAmount identifies the notified total value of a product. The Buyer and Seller agreed upon this amount as part of a purchase contract for a source of supply. The TargetAmount is of type GDT: Amount. The GoodsReceiptProcessingDuration indicates the time that elapses from when a product is received to when it is made available for the purpose of procurement. The goods receipt processing duration is required for checking the product and placing it in storage, for example. It is taken into account during scheduling. The GoodsReceiptProcessingDuration is of type GDT: Duration. The PlannedDeliveryDuration indicates the planned time required for delivering the product from an external source of supply. The planned delivery duration may be specified in the purchase contract so that the earliest availability date may be checked and the release date for a purchase requisition calculated. The PlannedDeliveryDuration is of type GDT: Duration.

A source of supply 29208 determines which quantities of which products may be procured from which locations, at what price, and when. The source of supply 29208 may be external (e.g., a vendor) or internal (e.g., a firm's own plant). The source of supply is used for supply planning. The sources of supply listed in a SourceOfSupplyNotification 29102 are derived from one base business document. The sources of supply 29208 normally correspond to the purchase contract items for individual products or product categories.

The following example will be used to clarify the information included in the SourceOfSupply 29208. DaimlerChrysler and Bosch conclude a purchase contract for the delivery of servo pumps. They agree to a total purchase quantity of 500,000 items totalling EUR 50 million. Bosch may offer a price of EUR 90 for purchase orders for more than 500 items. The agreement is valid for DaimlerChrysler ship-to locations in Stuttgart and Böblingen. DaimlerChrysler and Bosch agree to the special price of EUR 90 for Stuttgart. With the conclusion of the purchase contract, DaimlerChrysler has a procurement option for servo pumps.

(i) Business Transaction Document Reference

The BusinessTransactionDocumentReference package 29210 groups the references to business documents on which a source of supply may be based. The Business TransactionDocumentReference package 29210 includes a PurchaseContractReference entity 29220 and a SchedulingAgreementReference entity 29222.

(c) Purchase Contract Reference

The PurchaseContractReference entity 29220 is a reference to an outline agreement governing the supply of materials or services by the supplier as required within a certain period. The PurchaseContractReference entity 29220 is of type GDT: BusinessTransactionDocumentReference. There is a 1:c relationship 29221 between the SourceOfSupply entity 29208 and the PurchaseContractReference entity 29220. In the example above, the number of the purchase contract concluded between DaimlerChrysler and Bosch is specified by the PurchaseContractReference entity 29220.

(a) Scheduling Agreement Reference

The SchedulingAgreementReference entity 29222 is a reference to an outline agreement governing the procurement of materials on predefined dates within a certain period. The SchedulingAgreementReference entity 29222 is of type GDT: BusinessTransactionDocumentReference. There is also a 1:c relationship 29223 between the SourceOfSupply entity 29208 and the SchedulingAgreementReference entity 29222.

(ii) Party

The Party package 29212 groups the business partners who may be involved with a base business document of a source of supply. The Party package 29212 includes a BuyerParty entity 29224 and a SellerParty entity 29226. If the flow of goods does not take place between the locations defined for the BuyerParty entity 29224 and the SellerParty entity 29226, the source of supply 29208 may be specified with ShipToLocation 29228 and ShipFromLocation 29230 entities in the location package 29214. If a source of supply 29208 refers to a purchase contract, the contract partners are listed in the respective BuyerParty entity 29224 and SellerParty entity 29226. Continuing with the previous example, DaimlerChrysler as the buyer is listed in the BuyerParty entity 29224 and Bosch as the seller is listed in the SellerParty entity 29226.

(a) Buyer Party

The BuyerParty entity 29224 identifies the company or person that purchases goods or services. The BuyerParty entity 29224 is of type GDT: BusinessTransactionDocumentParty, where the "InternalID" is used. A BuyerParty 29224 does not have to be listed for an internal source of supply 29208. There is a 1:c relationship 29225 between the SourceOfSupply entity 29208 and the BuyerParty entity 29224.

(b) Seller Party

The SellerParty entity 29226 identifies the company or person that sells goods or services. The SellerParty entity 29226 is of type GDT: BusinessTransactionDocumentParty, where the "InternalID" is used. A SellerParty 29226 does not have to be listed for an internal source of supply 29208. There is a 1:c relationship 29227 between the SourceOfSupply entity 29208 and the SellerParty entity 29226.

(iii) Location

The Location package 29214 includes information about the locations between which goods may flow. The Location package 29214 includes a ShipToLocation entity 29228 and a ShipFromLocation entity 29230. If more than one ship-to or ship-from location is specified, the source of supply 29208 is valid for all combinations of these locations. In other words, the ship-from locations listed are valid sources of supply for the ship-to locations. In the example above, for DaimlerChrysler, Stuttgart and Böblingen are listed as ship-to locations 29228 for a source of supply 29208. In this example, if servo pumps are required for the production location in Hungary, the specified source of supply 29208 cannot be used.

The ShipToLocation entity 29228 identifies the location to which goods are to be delivered or where services are to be provided. The ShipToLocation entity 29228 is of type GDT: BusinessTransactionDocumentLocation, where the "InternalID" is used. The ship-to location 29228 is specified if the ship-to address differs from the BuyerParty address and is required for accurately specifying the source of supply 29208. There is a 1:cn relationship 29229 between the SourceOfSupply entity 29208 and the ShipToLocation entity 29228.

The ShipFromLocation entity 29230 identifies the location from which goods may be shipped. The ShipFromLocation entity 29230 is of type GDT: BusinessTransactionDocumentLocation, where the "InternalID" is used. The ship-from location 29230 is specified if the ship-from address differs from the SellerParty address and is required for accurately specifying the source of supply. There is also a 1:cn relationship 29231 between the SourceOfSupply entity 29208 and the ShipFromLocation entity 29230.

(iv) Product Information

The ProductInformation package 29216 groups the information required for identifying, describing, and classifying a product that may be procured from a source of supply 29208. The ProductInformation package 29216 includes a Product entity 29232 and a ProductCategory entity 29234. In one implementation, either a product 29232 or product category 29234 is specified in a source of supply 29208.

The Product entity 29232 identifies, describes, and classifies the product or service. The Product entity 29232 is of type GDT: BusinessTransactionDocumentProduct, where the "InternalID" is used. There is a 1:c relationship 29233 between the SourceOfSupply entity 29208 and the Product entity 29232.

The ProductCategory entity 29134 identifies the product category for the product or service. The ProductCategory entity 29134 is of type GDT: BusinessTransactionDocumentProduct Category, where the "InternalID" is used. There is a 1:c relationship 29235 between the SourceOfSupply entity 29208 and the ProductCategory entity 29234.

(v) Price Information

The PriceInformation package 29218 groups the information required for calculating the payment due for a product that may be procured from a source of supply 29208. The PriceInformation package 29218 includes a Price entity 29236, a Scale entity 29238, and a Line entity 29240. The PriceInformation package 29218 may be used to transfer an effective price function for a source of supply 29208. During sourcing, this information may be used in Supply Chain Planning 29106 to determine the cheapest source of supply if a decision has to be made between more than one SourceOfSupply 29208.

(a) Price

The Price entity 29236 identifies the remuneration for a product, which is valid for a certain period and ship-to location, and may be scaled according to quantity. The price entity 29136 includes a ShipToLocation (e.g., in the ShipToLocation entity 29228), a ValidityPeriod, a FixedCostsAmount, and a NetUnitPrice. The ShipToLocation identifies the ship-to location for which the pricing scale is valid, and is of type GDT: BusinessTransactionDocumentLocation. The ValidityPeriod identifies the validity period for the pricing scale, and is of type GDT: DateTimePeriod. The FixedCostsAmount identifies the fixed costs for a procurement transaction, and is of type GDT: Amount. The NetUnitPrice identifies the net price for a base quantity of a product, and is of type GDT: Price. As shown in FIG. 292, there is a 1:cn relationship 29237 between the SourceOfSupply entity 29208 and the Price entity 29236.

The Price entity 29236 may reference or include a PriceScale or Scale entity 29238 and a PriceScaleLine or Line entity 29240. The NetUnitPrice is specified as an element of the Price entity 29236 if a pricing scale has not been specified. If a ship-to location-specific price is specified, the ship-to location is also listed in the Location package 29214 and specified with the same identifiers (such as "InternalID"). As shown in FIG. 292, there is a 1:c relationship 29239 between the Price entity 29236 and the Scale entity 29238.

(b) Price Scale

The PriceScale entity 29238 includes a set of price scale lines arranged linearly in accordance with a scale (axis) base type. The Scale 29238 includes a AxisIntervalBoundaryTypeCode, which is a coded representation for typing the discrete values on a scale as interval boundaries. The PriceScale entity 29238 delivers the interpretation of scale axis values (scale levels) in a price scale. The AxisIntervalBoundaryTypeCode is of type GDT: ScaleAxisIntervalBoundaryTypeCode. The PriceScale 29238 may also reference or include a Line entity 29240.

(c) Price Scale Line

The PriceScaleLine entity (or Line entity 29240) identifies the price of a product depending on the quantity. The Line entity 29240 includes a Quantity and a NetUnitPrice. The Quantity is the quantity of the product in the base unit of measure (scale quantity), and is of type GDT: Quantity. The NetUnitPrice is the net price for the quantity of the product, in the base unit of measure, which is defined in Quantity, and is of type GDT: Price. A PriceScaleLine 29240 consists of a price scale axis value or price scale level ("Quantity") and a price scale rate ("NetUnitPrice"). As shown in FIG. 292, there is a 1:n relationship 29241 between the Scale entity 29238 and the Line entity 29240.

(3) Message Data Type Element Structure

FIGS. 293A-D depict the element structure for the Source Of Supply Notification 29102. The element structure is similar to the above described data model of the Source Of Supply Notification as reflected in FIG. 292, but provides additional information regarding the details for interfacing with or implementing a Source Of Supply Notification. As shown in FIGS. 293A-D, the element structure identifies the different packages 29300 that may be in a respective Source Of Supply Notification 29102. The element structure for the Source Of Supply Notification includes six levels 29302, 29304, 29306, 29308, 29310, and 29312 associated with a respective package 29300. The element structure for a Source Of Supply Notification also identifies the cardinality 29314 and data type 29316 for the elements at respective levels 29302, 29304, 29306, 29308, 29310, and 29312 in a package 29300.

The outermost package of this interface is a SourceOfSupplyMessage package 29318, which includes a SourceOfSupplyMessage entity 29320 at the first level 29302. The SourceOfSupplyMessage entity is of message data type SourceOfSupplyMessage 29322.

The SourceOfSupplyMessage package 29318 includes a SourceOfSupply package 29324 that has a SourceOfSupply entity 29326. There is one or more 29328 SourceOfSupply entities 29326, each being of global data type ("GDT"): SourceOfSupply. As shown in FIGS. 293A-B, each SourceOfSupply entity 29326 includes an ActiveIndicator 29332, a DeletedIndicator 29338, a SourcingPriorityCode 29344, a ValidityPeriod 29350, a TargetQuantity 29356, a TargetAmount 29362, a GoodsReceiptProcessingDuration 29368, and a PlannedDeliveryDuration 29374. The ActiveIndicator 29332 is of type GDT: ActiveIndicator. The DeletedIndicator 29338 is of type GDT: DeletedIndicator 29342. The SourcingPriorityCode 29344 is of type GDT: BusinessTransactionPriorityCode 29348. The ValidityPeriod 29350 is of type GDT: DateTimePeriod 29354. The TargetQuantity 29356 is of type GDT: Quantity 29360. The TargetAmount 29364 is of type GDT: Amount 29366. The GoodsReceiptProcessing Duration 29368 is of type GDT: Duration 29372. The PlannedDeliveryDuration 29374 is also of type GDT: Duration 29378. For each SourceOfSupply entity 29326, there is as follows: one 29334 ActiveIndicator 29332; one 29340 DeletedIndicator 29338; zero or one 29346 SourcingPriorityCode 29344; one 29352 ValidityPeriod 29350; zero or one 29358 TargetQuantity 29356; zero or one 29364 TargetAmount 29364; zero or one 29370 GoodsReceiptProcessing Duration 29368; and zero or one 29376 PlannedDeliveryDuration 29374.

The SourceOfSupply package 29324 also includes a BusinessTransactionDocument Reference package 29380, a Party package 29382, a Location package 29386, a Product Information package 29388, and a Price Information package 29388.

The BusinessTransactionDocumentReference package 29380 includes a PurchaseContractReference entity 29390 of type GDT: BusinessTransactionDocumentReference 29394 and a SchedulingAgreementReference entity 29396 of type GDT: BusinessTransactionDocumentReference 29300A. There is zero or one 29392 PurchaseContractReference entity 29390 for each SourceOfSupply entity 29324. Similarly, there is zero or one 29398 SchedulingAgreementReference entity 29396 for each SourceOfSupply entity 29324.

The Party package 29382 includes a BuyerParty entity 29302A of type GDT: BusinessTransactionDocumentParty 29306A and a SellerParty entity 29308A of type GDT: BusinessTransactionDocumentParty 29312A. There is zero or one 29304A BuyerParty entity 29390 for each SourceOfSupply entity 29324. Similarly, there is zero or one 29310A SellerParty entity 29396 for each SourceOfSupply entity 29324.

The Location package 29384 includes a ShipToLocation entity 29314A of type GDT: BusinessTransactionDocumentLocation 293 18A and a ShipFromLocation entity 29320A of type GDT: BusinessTransactionDocumentLocation 29324A. There is any number 29316A of ShipToLocation entities 29314A for each SourceOfSupply entity 29324. Similarly, there is any number 29322A of ShipFromLocation entities 29320A for each SourceOfSupply entity 29324.

The Product Information package 29386 includes a Product entity 29326A of type GDT: BusinessTransactionDocumentProduct 29330A and a ProductCategory entity 29332A of type GDT: ProductCategory 29336A. There is zero or one 29328A Product entities 29329114A and zero or one 29334A Product Categories 29332A for each SourceOfSupply entity 29324.

As shown in FIG. 293C, the Price Information package 29388 includes a Price entity 29338. There is any number 29340A of Price entities 38A for each SourceOfSupply entity 29324. Each Price entity 29236 includes: a ShipToLocation entity 29342A of a type GDT: BusinessTransactionDocumentLocation 29346A; a ValidityPeriod 29348A of a type GDT:DateTimePeriod 29352A; a FixedCostsAmount entity 29354A of a type GDT: Amount 29358A; and a NetUnitPrice 29360A of a type GDT: Price 29364A. For each SourceOfSupply entity 29324, there is zero or one 29344A ShipToLocation 29342A, one 29350A ValidityPeriod 29348A, zero or one 29356A FixedCostsAmount 29354A, and zero or one 29360A NetUnitPrice 29360A.

Each Price entity 29338 also includes zero or one 29368A PriceScales or Scale entities 29368A. Each Scale 29366A includes one 29172A AxisIntervalBoundary Type Code 29370A of a type GDT: ScaleAxisIntervalBoundaryTypeCode 29374A. Each Price entity 29338 may also include one or more 29378A of Price Scale Line entities 29376A. Each Line entity 29376A includes a Quantity 29380A of a type GDT:Quantity 29384A and a NetUnitPrice 29386A of a type GDT: Price 29390A.

c) Purchase Order Interfaces

PurchaseOrder interfaces are the interfaces that are required in a B2B process to exchange purchase orders and order confirmations between a buyer and a seller. Traditional methods of communication during an ordering process, such as via mail or fax, are cost intensive, prone to error, and relatively slow, since the data has to be entered manually. Electronic communication between the procurement system and a sales system eliminates such problems. Purchase order interfaces directly integrate the applications that implement the interfaces and form a basis for mapping data to widely-used standard formats, such as RosettaNet. More than just a simple interface structure, the purchase order interfaces define the underlying corporate significance and, at the same time, dispense with the need to exchange proprietary information during straightforward ordering processes. In this way, applications that implement purchase order interfaces can be integrated without the need for complex project work.

(1) Message Types

There are a total of four message types for mapping a B2B ordering process: (1) PurchaseOrderRequest; (2) PurchaseOrderChangeRequest; (3) PurchaseOrderCancellationRequest; and (4) PurchaseOrderConfirmation. The PurchaseOrderRequest is sent from a buyer to a seller, and is used to initiate a new ordering process. The PurchaseOrderChangeRequest is sent from a buyer to a seller, and is used to change a purchase order during an ordering process. Changing a purchase order includes creating new items, changing existing items, and cancelling items. The PurchaseOrderCancellationRequest is sent from a buyer to a seller, and is used to cancel a purchase order. The PurchaseOrderConfirmation is sent from a buyer to a seller, and is used to confirm a purchase order. It can be sent in direct response to a PurchaseOrderRequest, a PurchaseOrderChangeRequest, or a PurchaseOrderCancellationRequest message, or without an immediately preceding message to display changes to the purchase order or its confirmation status. The seller can change a purchase order by creating new items or by changing or rejecting existing items.

(a) Purchase Order Request

A PurchaseOrderRequest is a buyer's request to the seller to deliver goods or provide services. The structure of the message type PurchaseOrderRequest is specified in the message data type PurchaseOrderMessage. Only parts of the maximum PurchaseOrderMessage structure are used. The PurchaseOrderRequest is the message that a buyer uses to start a new ordering process with a seller.

(b) Purchase Order Change Request

A PurchaseOrderChangeRequest is a change made to the buyer's request to the seller to deliver goods or provide services. The structure of the message type PurchaseOrderChangeRequest is specified in the message data type PurchaseOrderMessage. Only parts of the maximum PurchaseOrderMessage structure are used. The PurchaseOrderChangeRequest is the message that a buyer uses to inform the seller of change requests during an ordering process. In a PurchaseOrderChangeRequest, the buyer can change header data, add new items, and change or cancel existing items.

(c) Purchase Order Cancellation Request

A PurchaseOrderCancellationRequest is a cancellation of the buyer's request to the seller to deliver goods or provide services. The structure of the message type PurchaseOrderCancellationRequest is specified in the message data type PurchaseOrderCancellationMessage. The PurchaseOrderCancellationRequest is the message that a buyer uses to inform the seller of a purchase order cancellation request during an ordering process.

(d) Purchase Order Confirmation

A PurchaseOrderConfirmation is a confirmation, partial confirmation, or a change sent from the seller to the buyer concerning the requested delivery of goods or provision of services. The structure of the message type PurchaseOrderConfirmation is specified in the message data type PurchaseOrderMessage. Only parts of the maximum PurchaseOrderMessage structure are used. The PurchaseOrderConfirmation is the message that a seller uses to confirm a purchase order with the buyer, or to inform the buyer of any purchase order change requests during an ordering process.

The seller can use the PurchaseOrderConfirmation message in three ways. First, the seller can explicitly confirm planned delivery dates/times, quantities, and prices with the buyer and propose substitute products. Second, the seller can inform the buyer of any purchase order change requests. Third, the seller can inform the buyer of the confirmation status of the purchase order. Possible statuses include "AP" (Accepted), "AJ" (Pending), and "RE" (Rejected). The confirmation status can be set at the header or item level. Rejection at the header level also signifies rejection of all items. Acceptance at the header level signifies general acceptance of the purchase order, while individual items can be accepted, open, or rejected. The same logic applies from items to subitems in item hierarchies. There are no restrictions for changes to the confirmation status, e.g., a change from "AP" (Accepted) to "RE" (Rejected) is permitted. The confirmation status indicates whether a seller will fulfil a purchase order. Accordingly, the seller has to confirm cancellation of a purchase order with the status "RE" (Rejected). If the confirmation status "AP" (Accepted) is set for a purchase order but no additional information is provided about confirmed delivery dates/times, quantities, etc., the purchase order is regarded as "confirmed as ordered."

Each PurchaseOrderConfirmation reflects the status of an item. Thus, if the status of a given PurchaseOrderConfirmation item is "AP" (Accepted), the relevant purchase order ("PURCHASE ORDER") item is confirmed "as ordered." If a change was requested for this item in a different PurchaseOrderConfirmation message, that change request is invalid.

(2) Message Choreography

Figure 294:
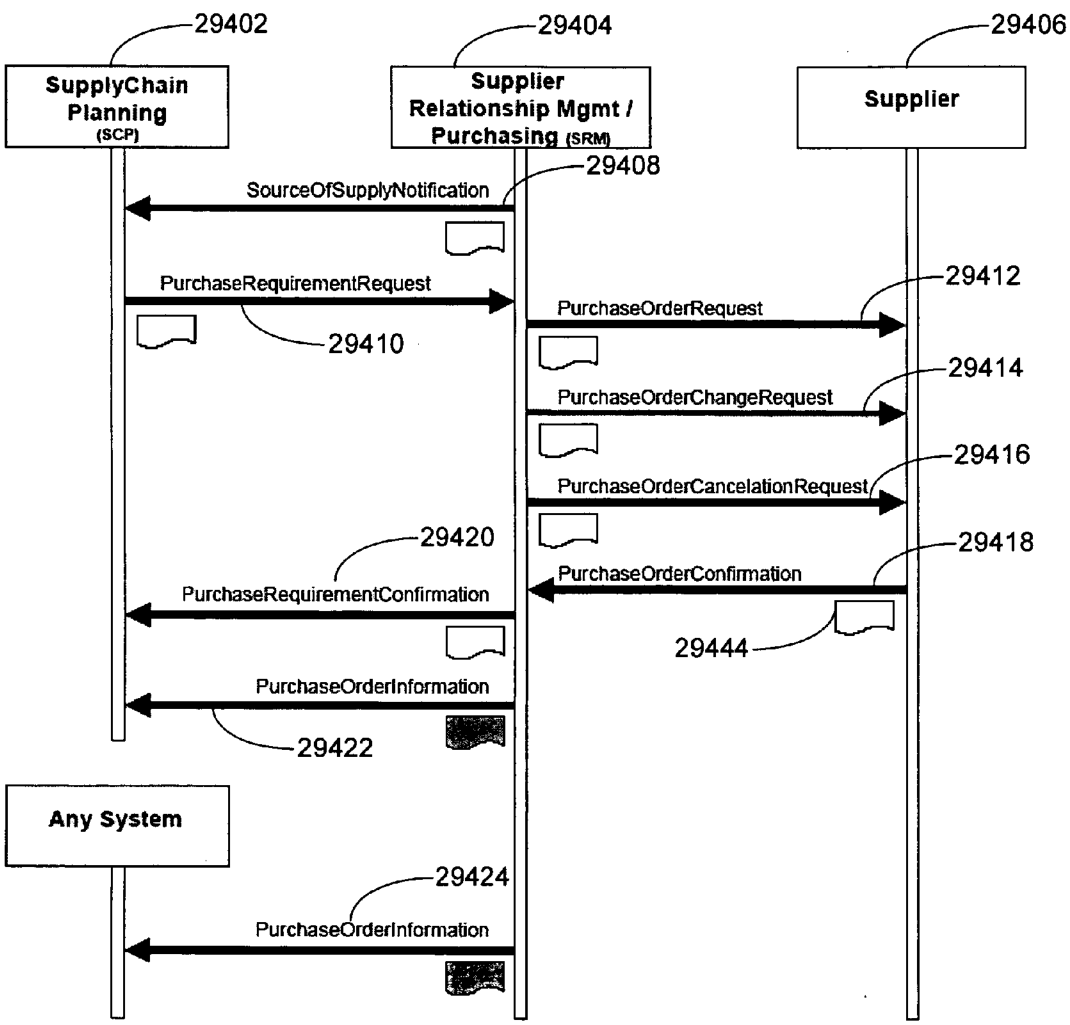
FIG. 294 depicts the message choreography for the Purchase Order interfaces in accordance with methods and systems consistent with the present invention.

The interaction between the purchase order interfaces in an ordering process is described in detail below. FIG. 294 depicts the message choreography for the purchase order interface. The choreography involves three business entities: Supply Chain Planning 29402, Supplier Relationship Mgmt Purchasing 29404, and Supplier 29406. The Supplier Relationship Mgmt Purchasing 29404 sends a SourceOfSupplyNotification 29408 to SupplyChain Planning 29402. SupplyChain Planning 29402 sends a PurchaseRequirementRequest 29410 to Supplier Relationship Mgmt Purchasing 29404. Supplier Relationship Mgmt Purchasing 29404 sends a PurchaseOrderRequest 29412, a PurchaseOrderChangeRequest 29414, and/or a PurchaseOrderCancellationRequest 29416 to Supplier 29406. Supplier 29406 sends a PurchaseOrderConfirmation 29418 to Supplier Relationship Mgmt Purchasing 29404. Supplier Relationship Mgmt Purchasing 29404 sends a PurchaseRequirementConfirmation 29420 and a PurchaseOrder Information 29422 to SupplyChain Planning 29402. Supplier Relationship Mgmt Purchasing 29404 sends a PurchaseOrder Information 29424 to Any System 29426.

(a) Process Flow

The buyer starts an ordering process by sending a PurchaseOrderRequest message. Once the ordering process has been started, the buyer can use a PurchaseOrderChangeRequest message to send a change request or a PurchaseOrderCancellationRequest message to send a purchase order cancellation request to the seller at any time. After receiving the PurchaseOrderRequest message, the seller can use a PurchaseOrderConfirmation message to inform the buyer of the status of the purchase order or to send change requests at any time. Once an ordering process has been started, there are no restrictions with regard to the order in which particular messages have to be sent. The buyer does not have to wait for confirmation from the seller before being allowed to send purchase order change requests, using a PurchaseOrderChangeRequest message.

In each PurchaseOrderRequest or PurchaseOrderChangeRequest message, the buyer can explicitly request a PurchaseOrderConfirmation message from the vendor by setting the FollowUpPurchaseOrderConfirmation/RequirementCode to "Expected." In this case, the seller should send a PurchaseOrderConfirmation in response to the receipt of a PurchaseOrderRequest, PurchaseOrderChangeRequest, or PurchaseOrderCancellationRequest message. To ensure that the response is sent as promptly as possible, no user interaction is required on the seller side. If a buyer's request cannot be automatically accepted or rejected, the confirmation status "AJ" (Pending) can be set. A PurchaseOrderConfirmation in response to a PurchaseOrderChangeRequest reconfirms all the items that were transferred with the PurchaseOrderChangeRequest. The seller should also send a PurchaseOrderConfirmation if the confirmation status of the entire purchase order or of a particular item is changed or if quantities, prices, or deadlines can be explicitly confirmed, or if changes are made to confirmations that have already been sent.

A PurchaseOrderConfirmation is sent by the seller if the seller rejects individual items or the entire purchase order, or if the seller requests changes to the purchase order.

The buyer uses a PurchaseOrderChangeRequest message to confirm the seller's change requests (by accepting the seller's requests as changes) or to reject them (by not accepting the seller's requests). To avoid endless loops, the buyer should not be permitted to use a PurchaseOrderChangeRequest message to automatically respond to mere changes to the confirmation status or to the explicit confirmation of delivery dates/times, quantities, and prices.

(b) Error Handling

A recipient system accepts every formally correct incoming purchase order message. The buyer resolves business problems using a PurchaseOrderChangeRequest or PurchaseOrderCancellationRequest message, and the seller resolves business problems using a PurchaseOrderConfirmation message. It is up to the recipient system to distinguish between technical and business errors. Borderline cases include incorrect ISO codes for currencies, or languages.

A procurement system cannot reject a PurchaseOrderConfirmation automatically. Instead, the procurement system uses a PurchaseOrderChangeRequest or provide other suitable mechanisms to avoid endless loops, i.e., to avoid having the procurement system continuously reject every confirmation of each rejection.

In order to restart an ordering process that is corrupt as a result of a failed message, the procurement system may provide an option for transferring the current status of the purchase order, together with all of the associated data, at any time using a PurchaseOrderChangeRequest message. In this message, the ItemCompleteTransmissionIndicator may be set to "true." The sales and distribution ("SD") system may provide the same functions for the PurchaseOrderConfirmation. In order to restart a process following a failed PurchaseOrderRequest message, the procurement system should be able to restart an ordering process at any time using a PurchaseOrderRequest message.

(c) Message Operations

The purchase order messages are implemented by eight message operations, four on the buyer side and four on the seller side. The buyer side operations are PurchaseOrderRequest_Out, PurchaseOrderChangeRequest_Out, PurchaseOrderCancellationRequest_Out, and PurchaseOrderConfirmation_In, and the seller side operations are PurchaseOrderRequest_In, PurchaseOrderChangeRequest_In, PurchaseOrderCancellationRequest_In, and PurchaseOrderConfirmation_Out.

(3) Message Data Type Purchase Order Message

The message data type PurchaseOrderMessage groups together the business information that is relevant for sending a business document in a message and the PurchaseOrder object in the business document. This message data type groups together the MessageHeader package and the PurchaseOrder package, described in detail below.

To ensure that all the elements and entities in the message data type PurchaseOrderMessage are used correctly with regard to their changeability in an ordering process, if no additional information is provided about the relevant element or the entity under "Use/Notes," both the buyer and the seller are allowed to change the element or entity as required. The receiving system is able to respond appropriately to such changes at the business level.

If it is specified under "Use/Notes" that the element or entity can be changed by either the buyer or the seller only, the other party should not be permitted to make any changes. Deletion of an element or entity is classed as a change, as is the initial transfer of an element or entity when a purchase order or new item within a purchase order is created. Exceptions to this are explicitly specified under "Use/Notes."

If it is specified under "Use/Notes" that the element or entity is not changed, changes should not be permitted once the element or entity has been created. The element or entity can be assigned a new value only when a purchase order or a new item within a purchase order is created; this value is no longer changed in all other messages.

A "change" is always an actual change and not a different way of representing the same situation. For example, a proprietary or standard ID can be used to reference the same product; both options are simply different ways of representing the same situation and therefore can be used alternatively without being considered a change. Different IDs for the same object and different sequences for elements that occur more than once are always considered as representing the same situation.

The message data type PurchaseOrderMessage is the structural basis for the message types PurchaseOrderRequest, PurchaseOrderChangeRequest, and PurchaseOrderConfirmation. If certain elements or entities in the message data type PurchaseOrderMessage are not used in all the message types based on the message data type PurchaseOrderMessage, this is specified explicitly under "Notes."

Figure 295A:
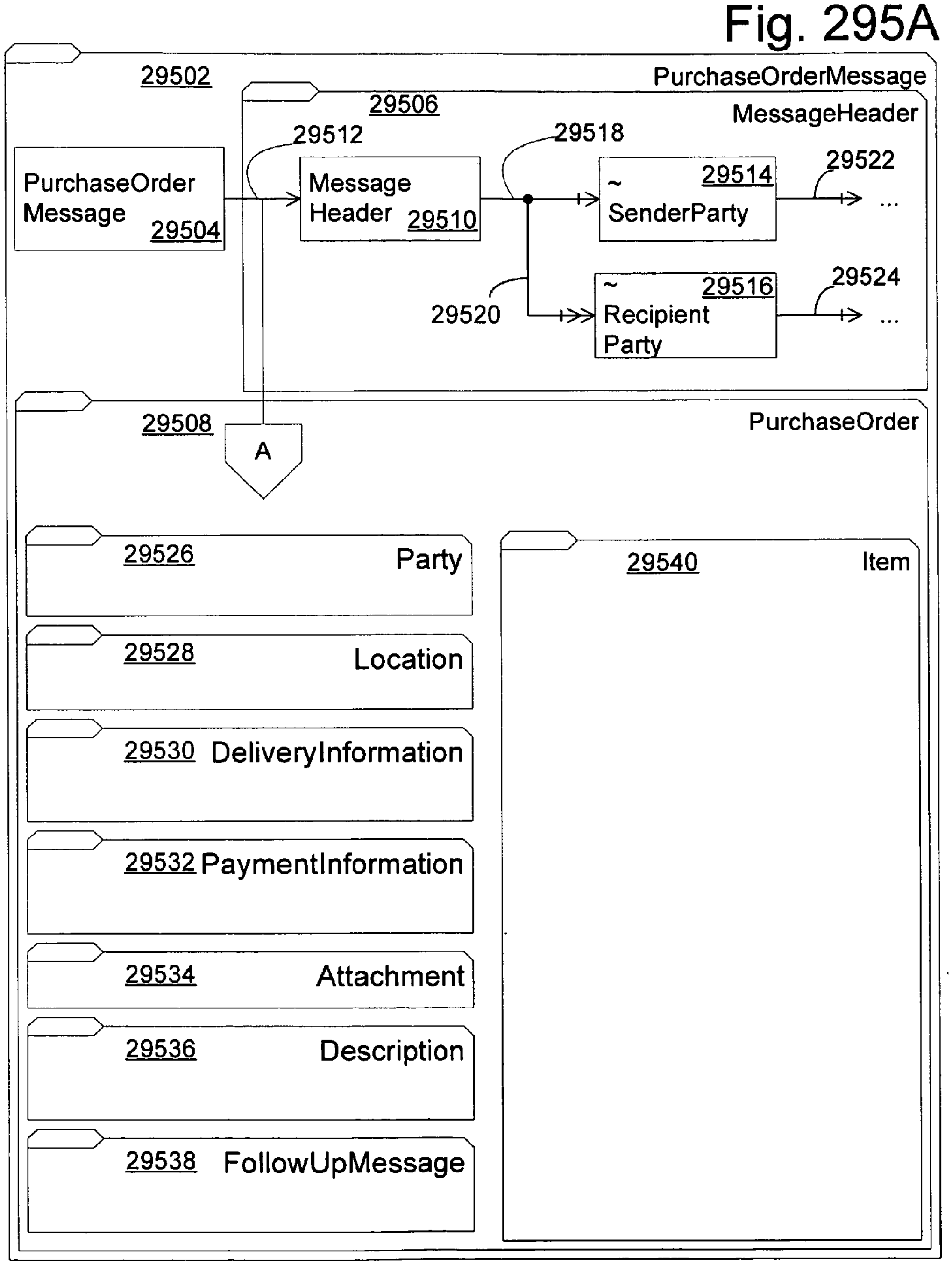
FIGS. 295A-P depict the data model for the Purchase Order interfaces in accordance with methods and systems consistent with the present invention.
Figure 295B:
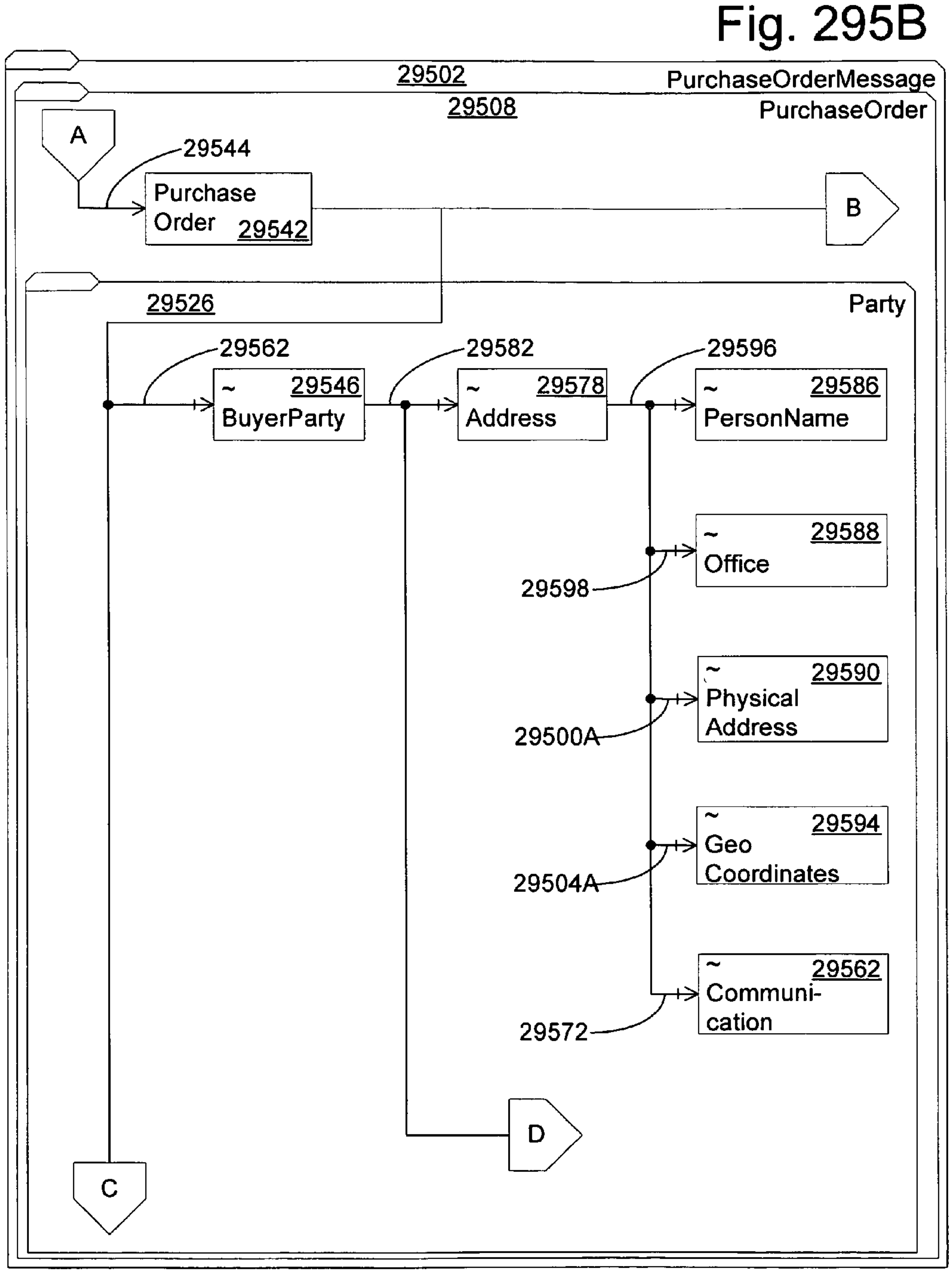
Figure 295C:
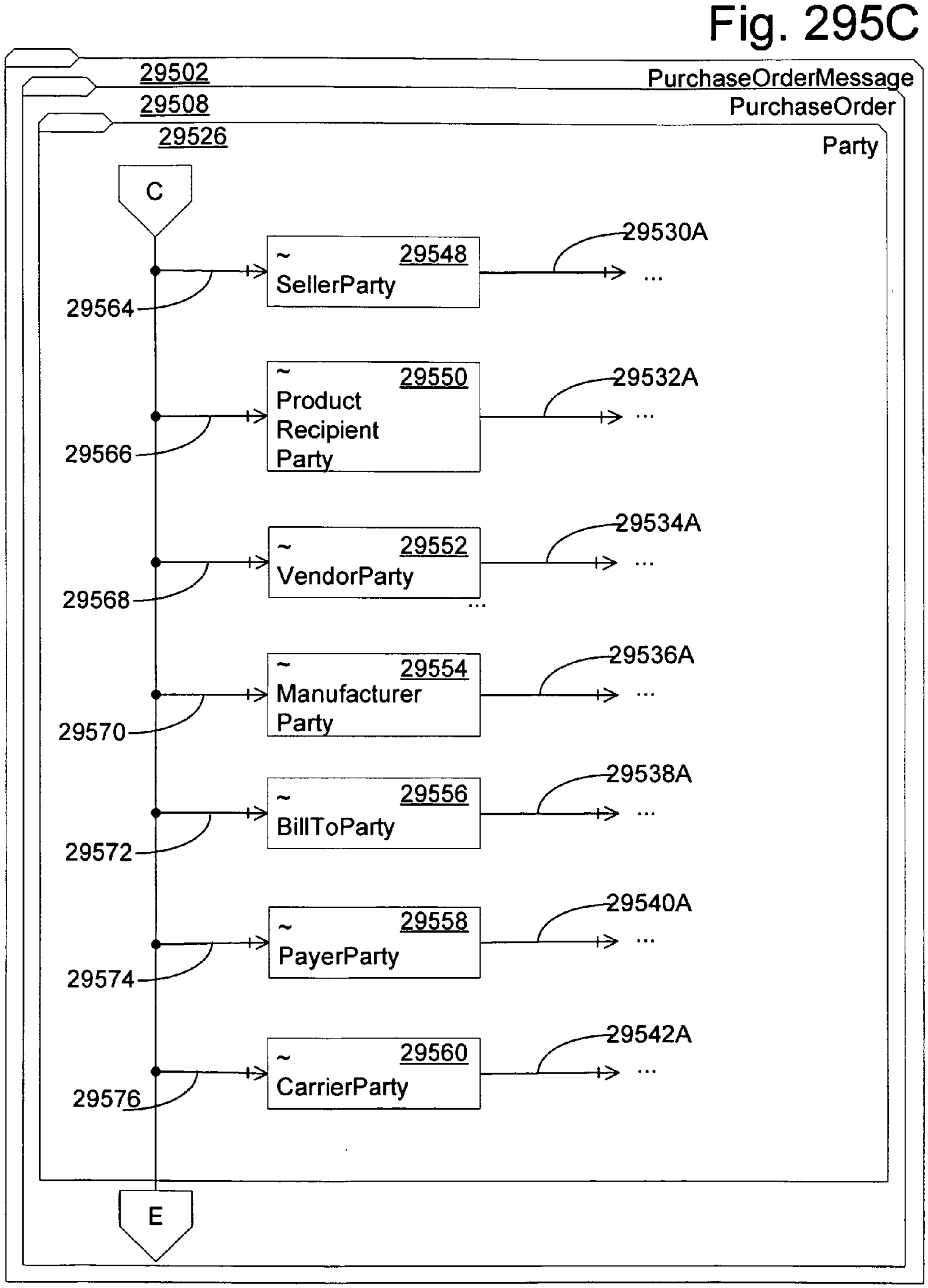
Figure 295D:
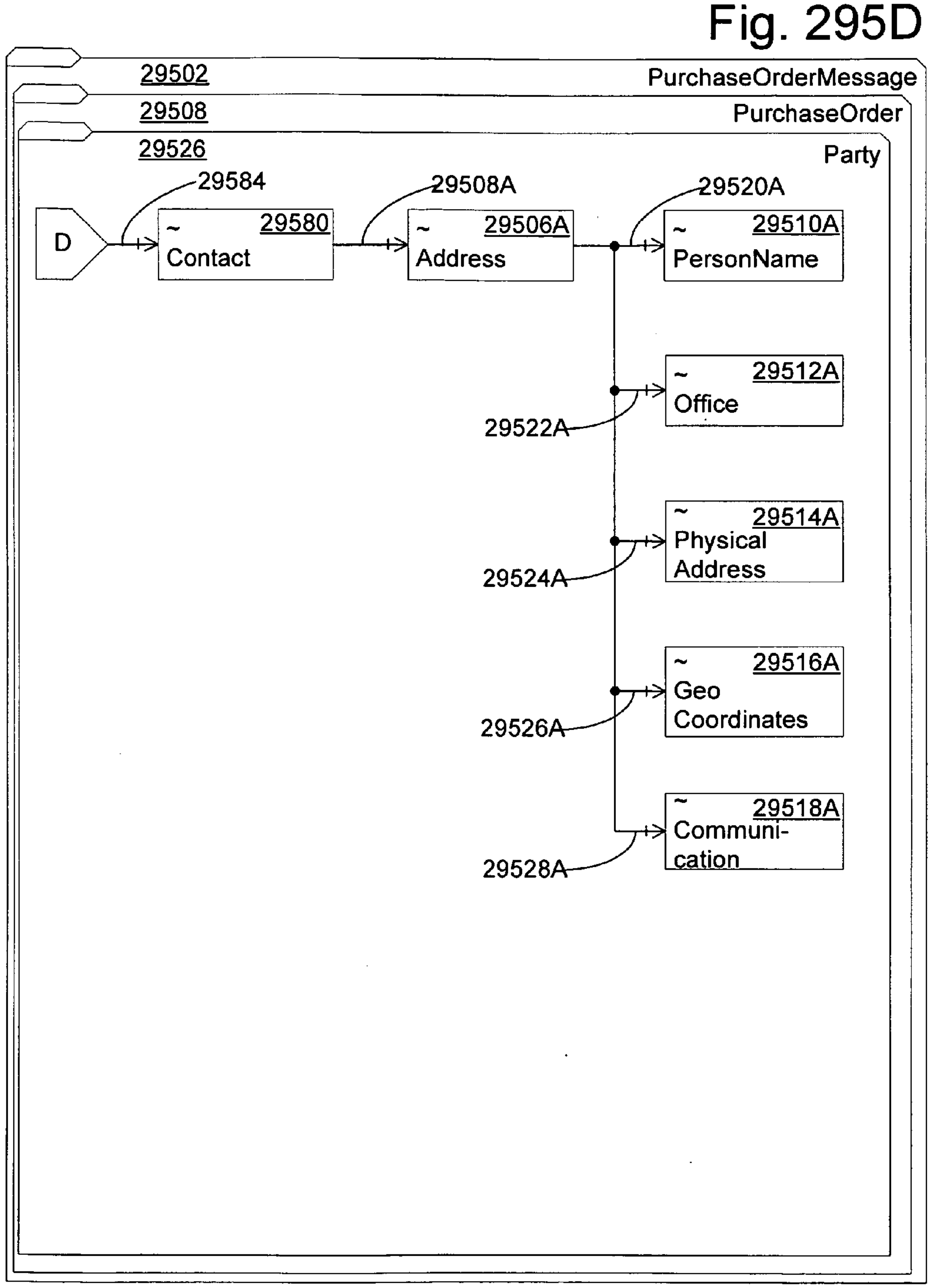
Figure 295E:
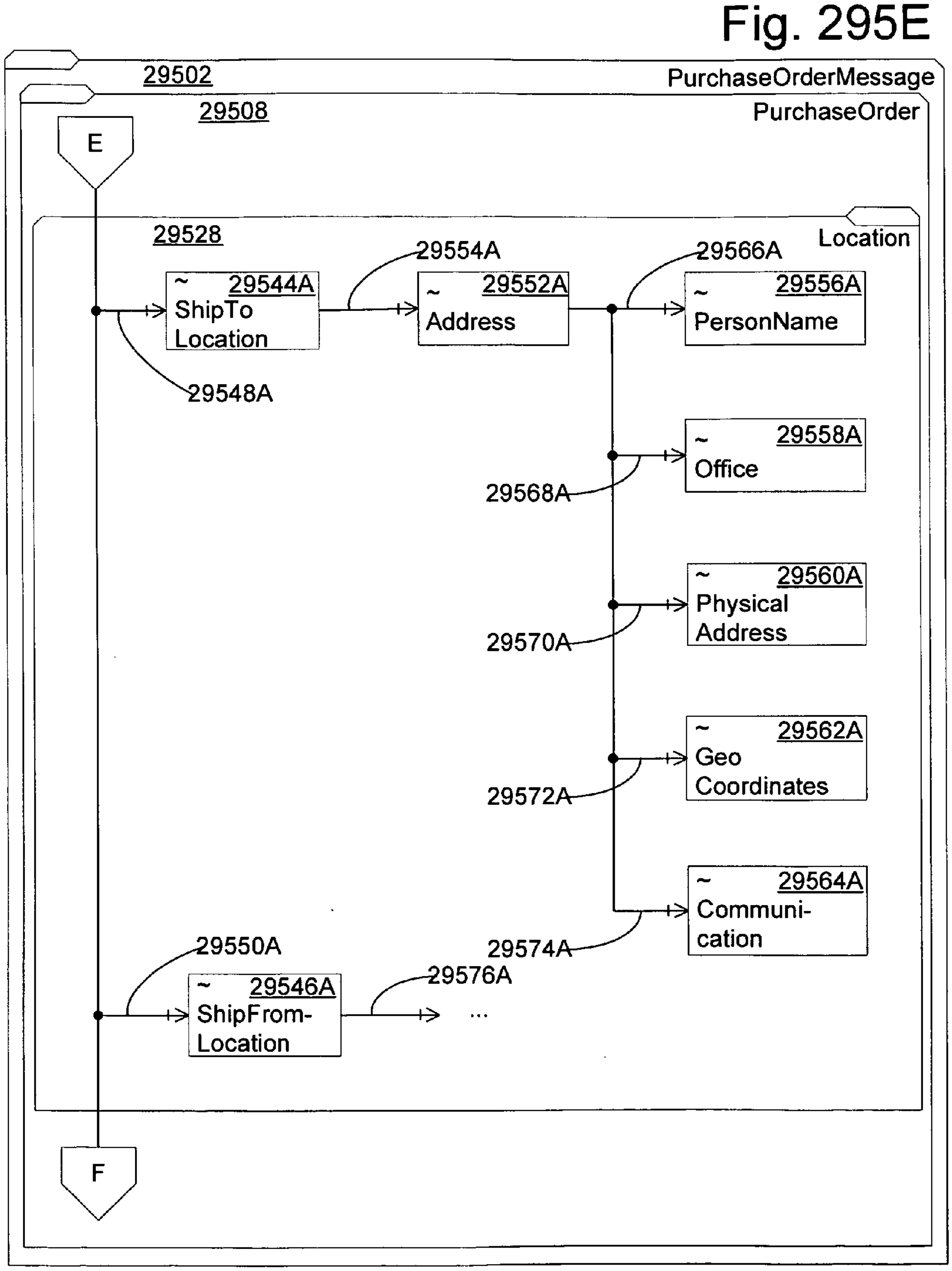
Figure 295F:
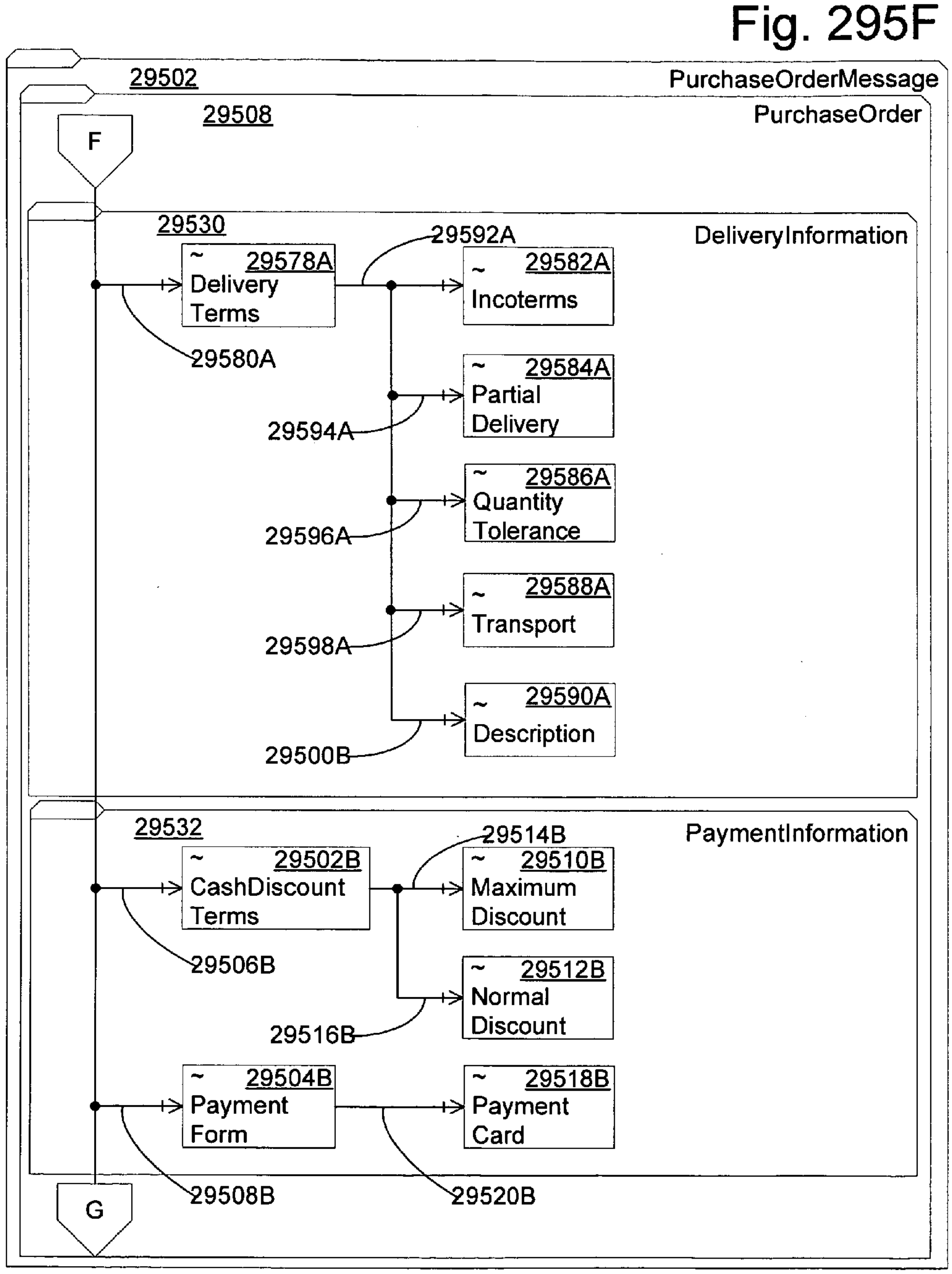
Figure 295G:
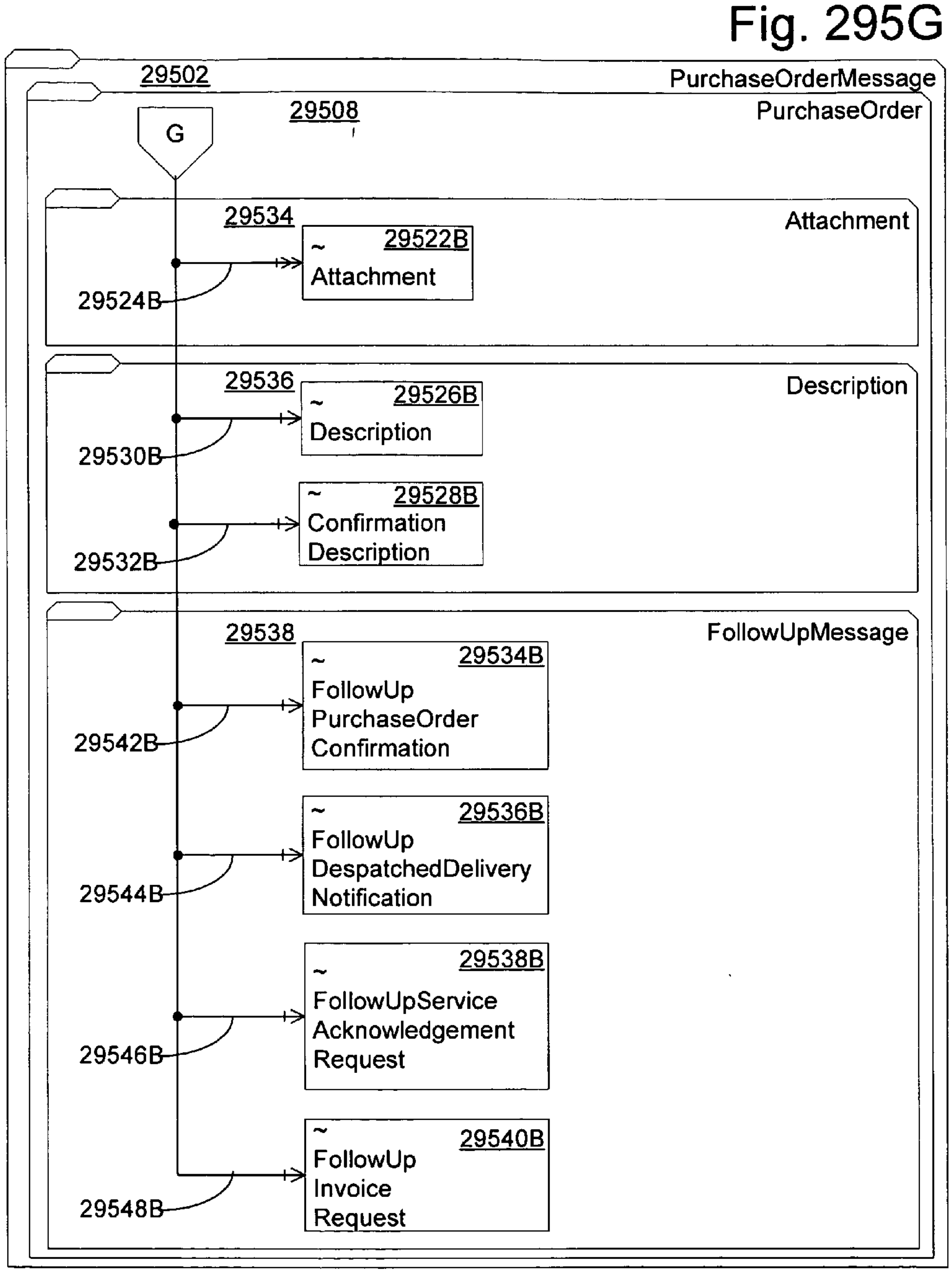
Figure 295H:
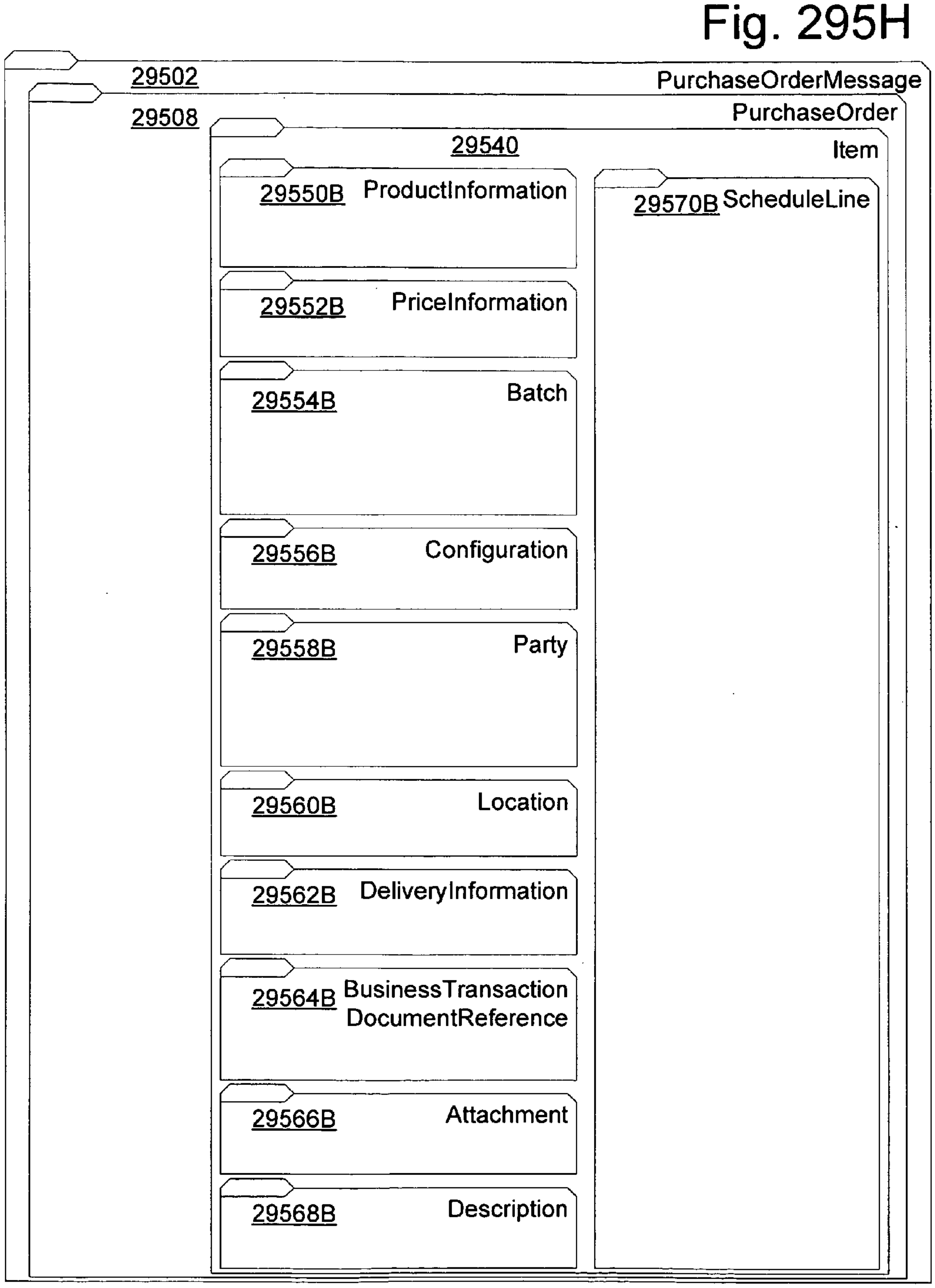
Figure 295I:
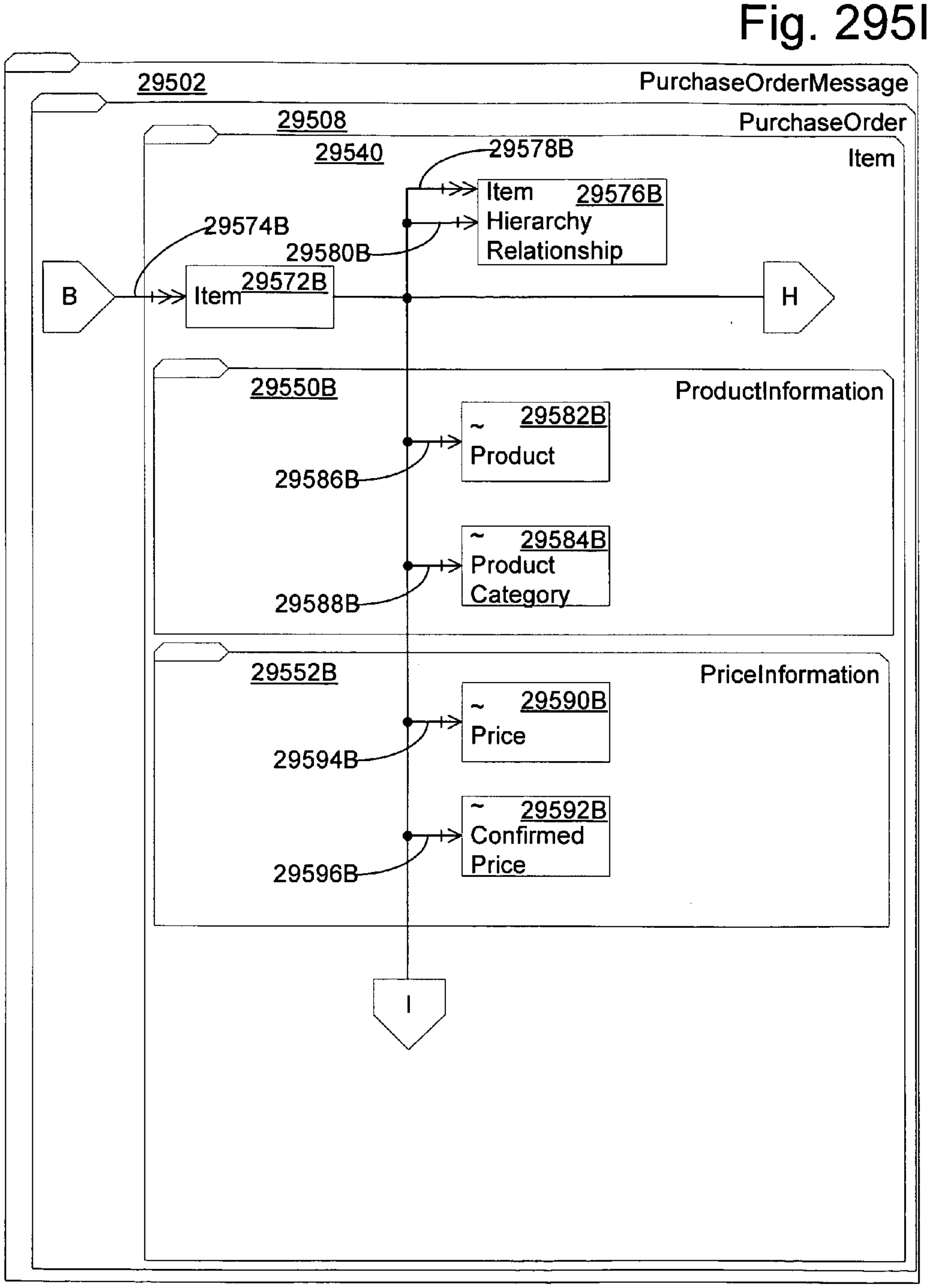
Figure 295J:
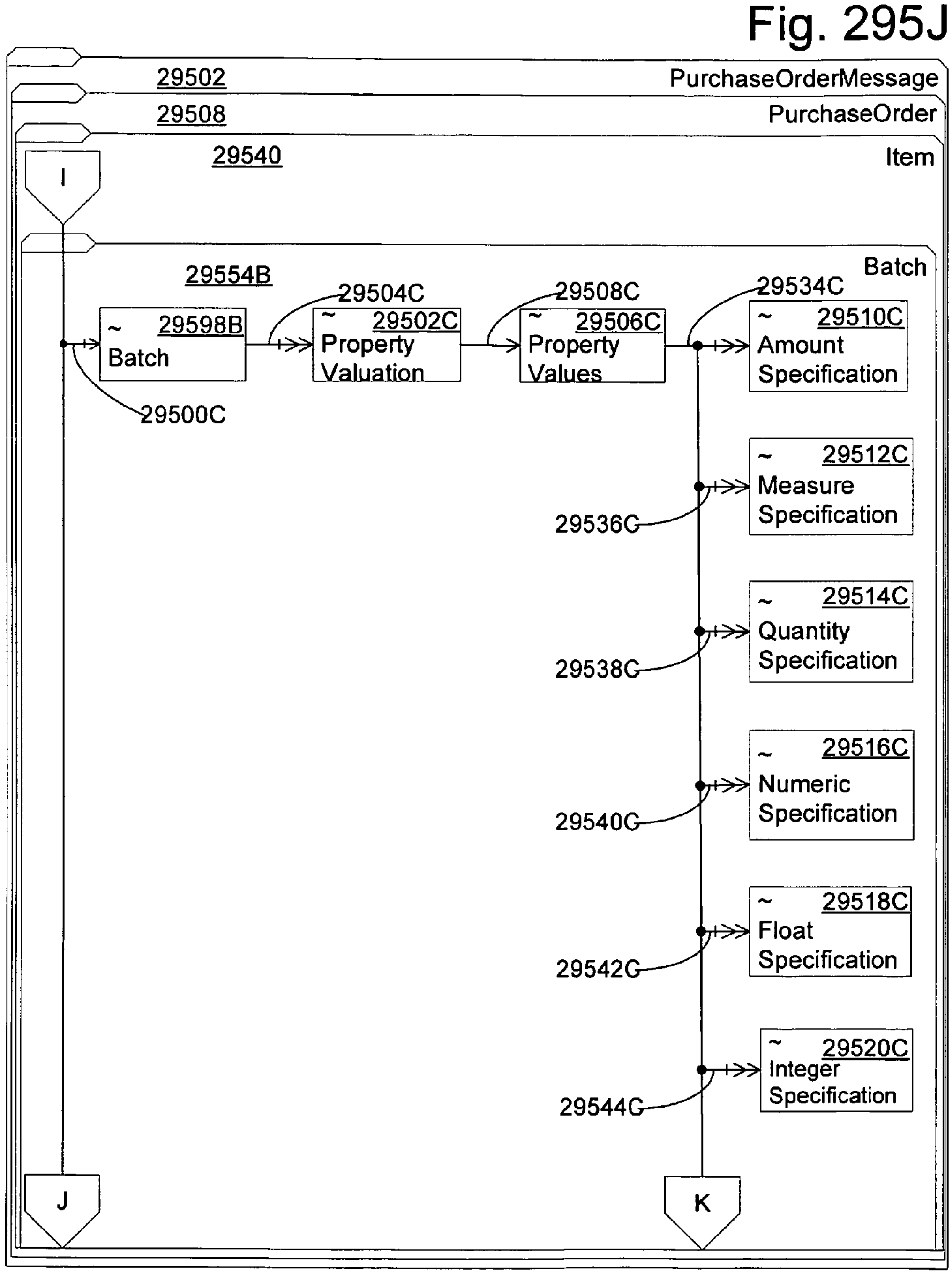
Figure 295K:
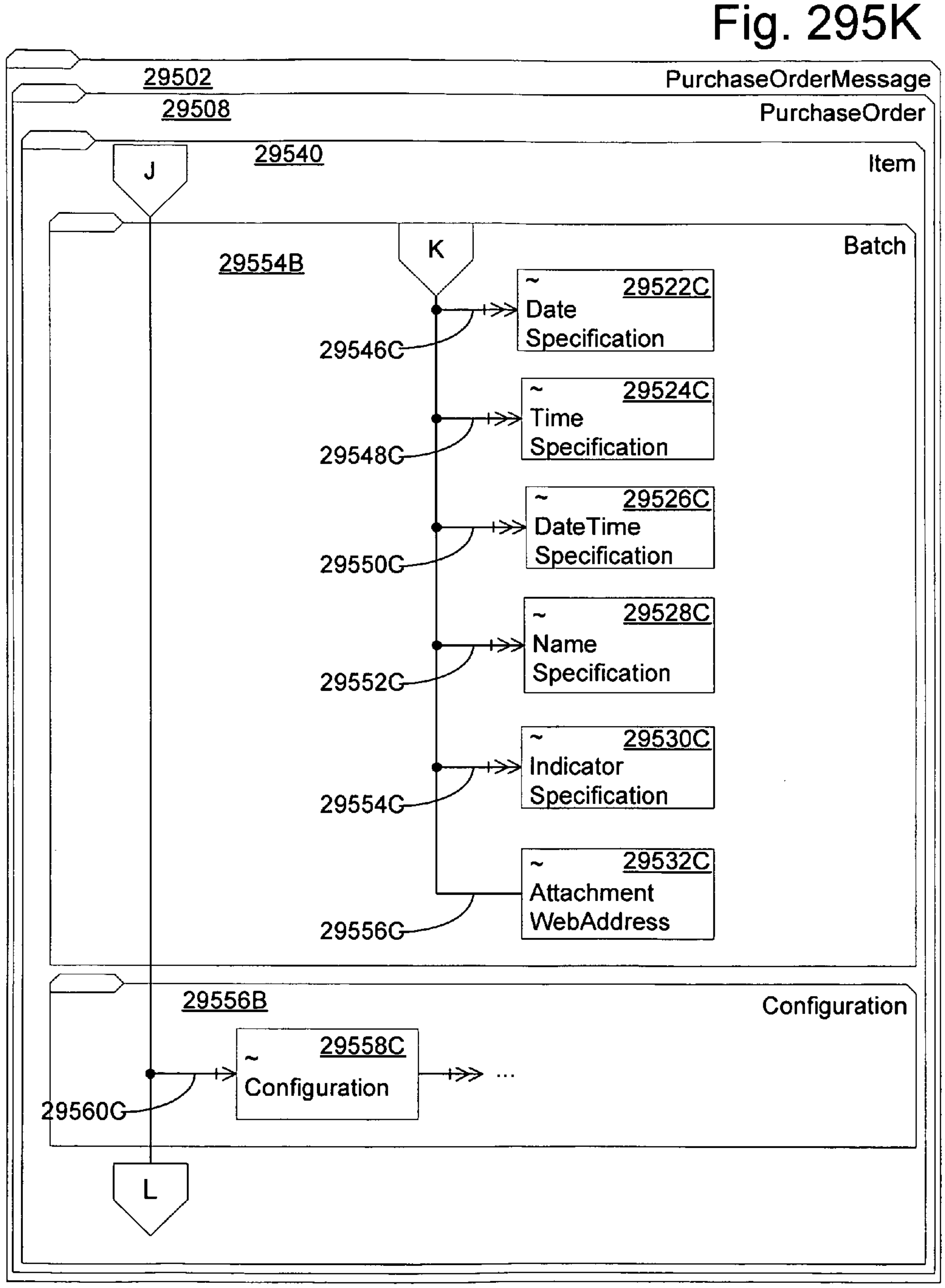
Figure 295L:
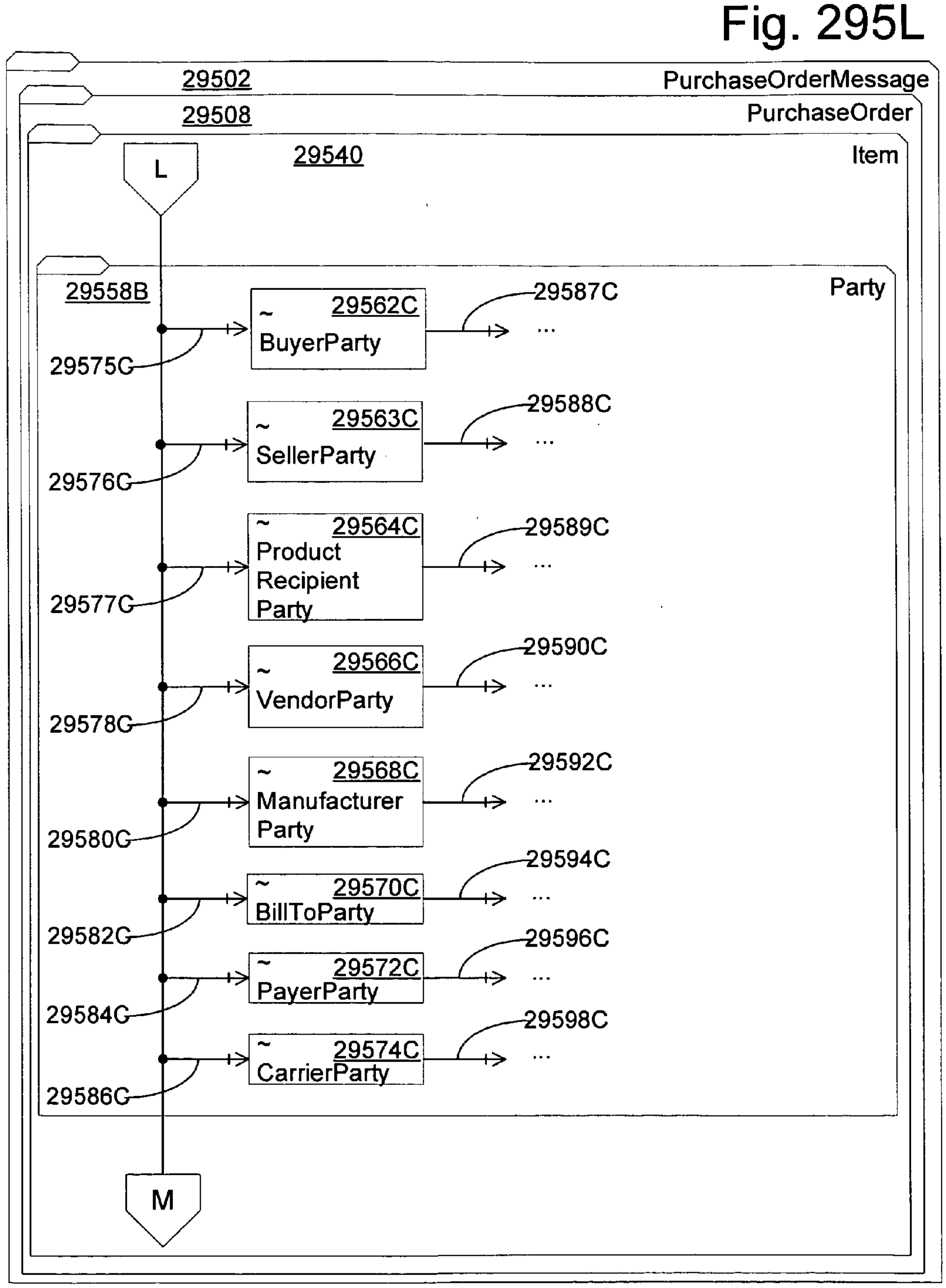
Figure 295M:
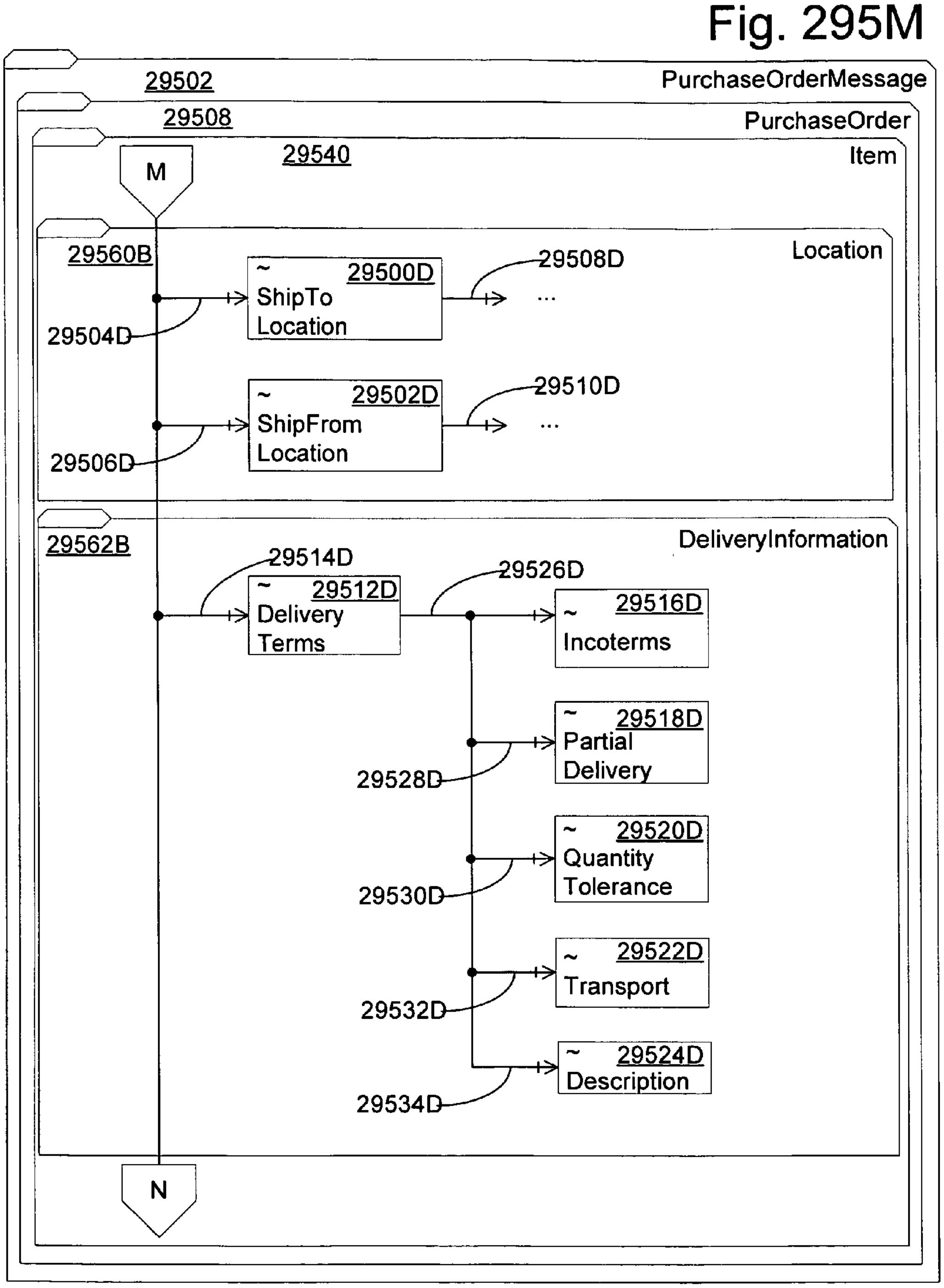
Figure 295N:
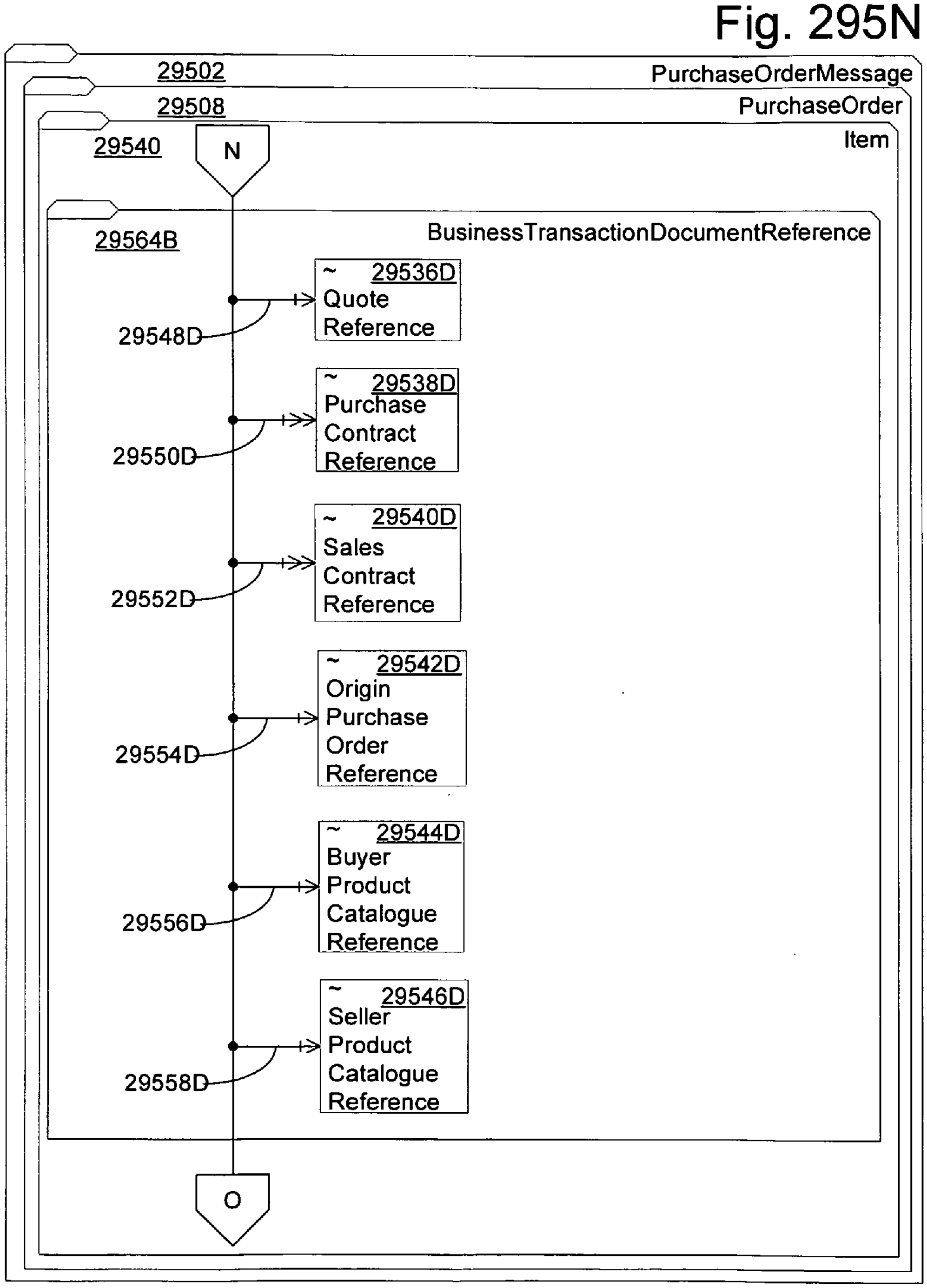
Figure 295O:
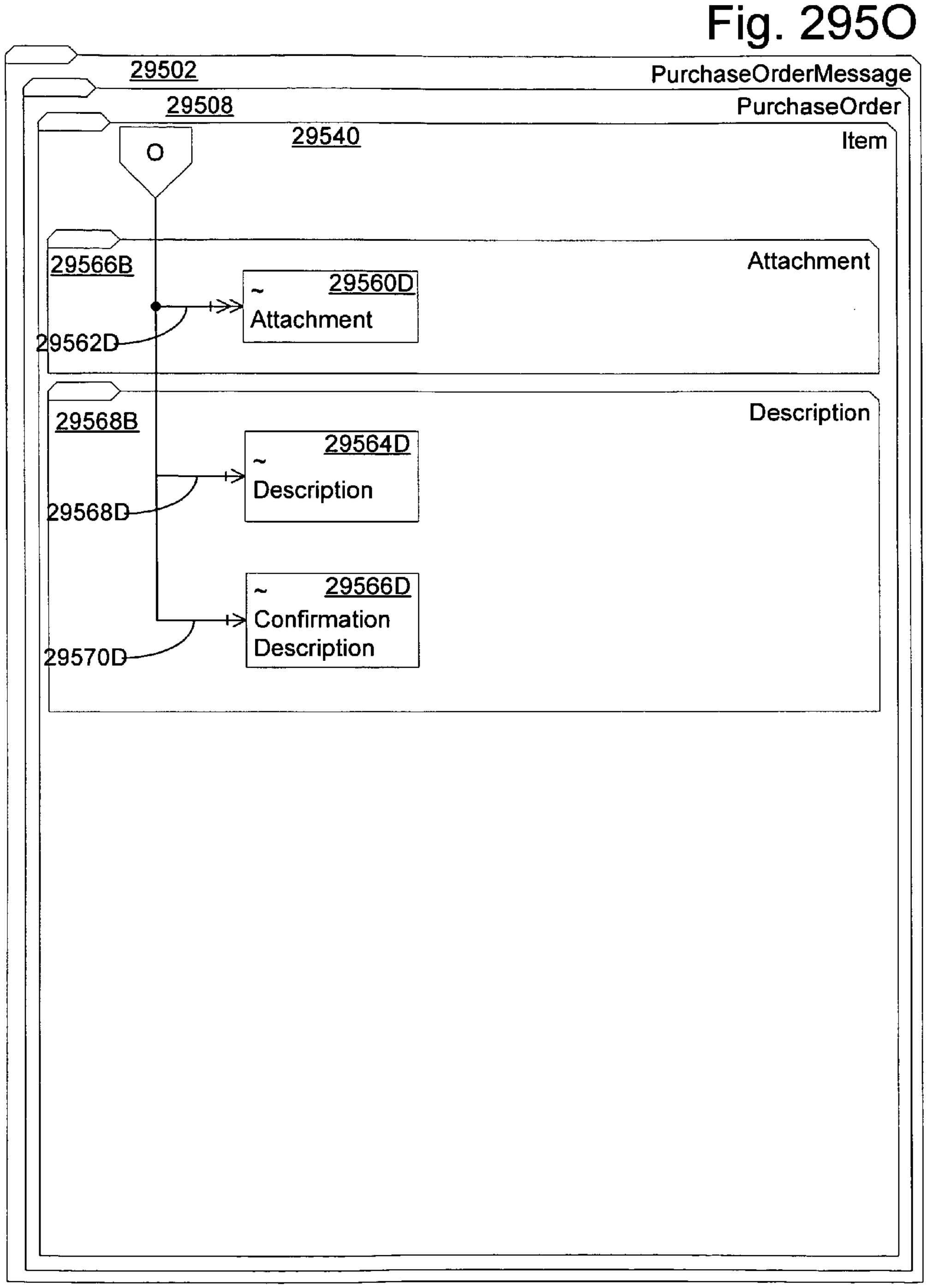
Figure 295P:
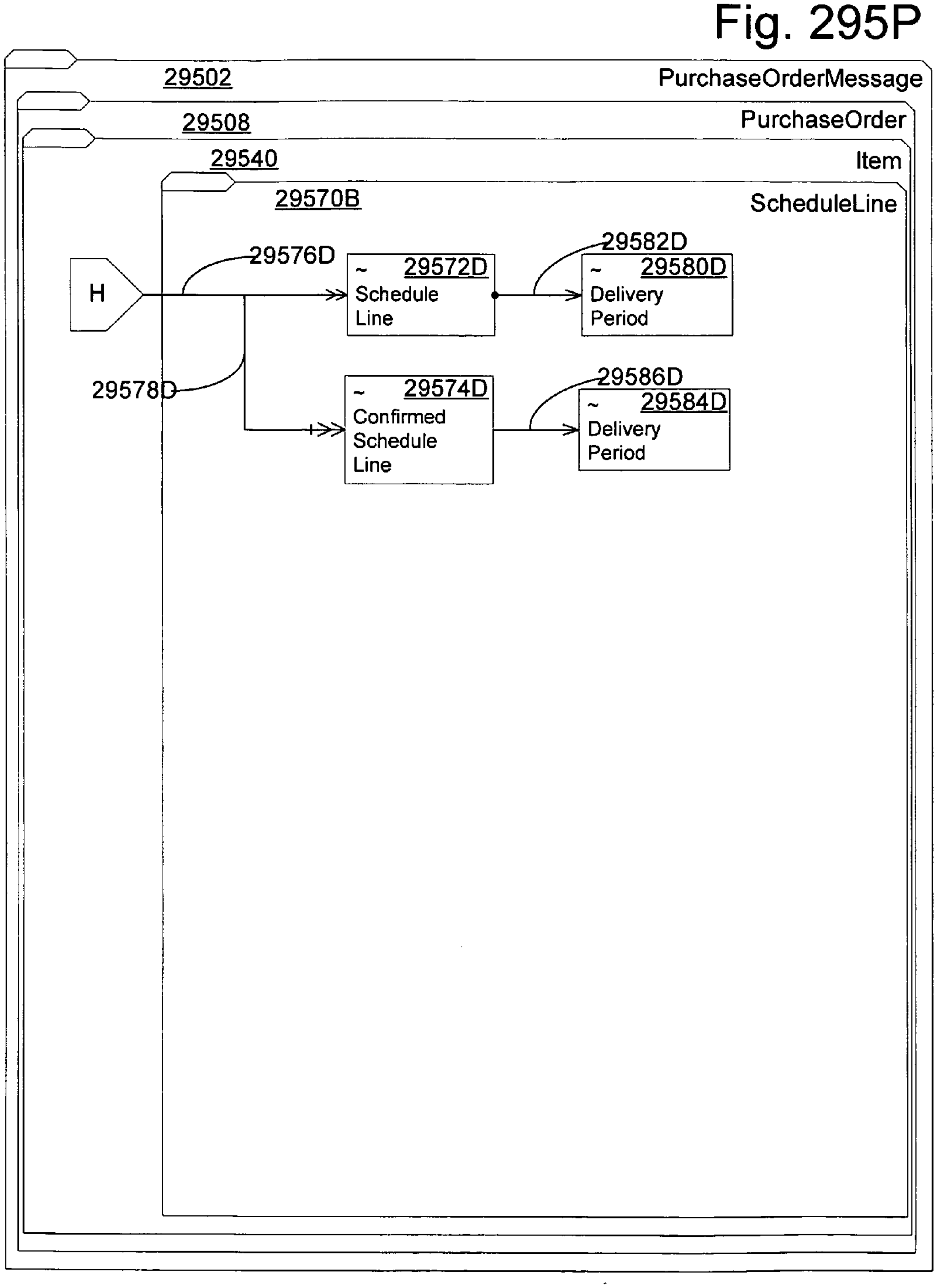
Figure 296:
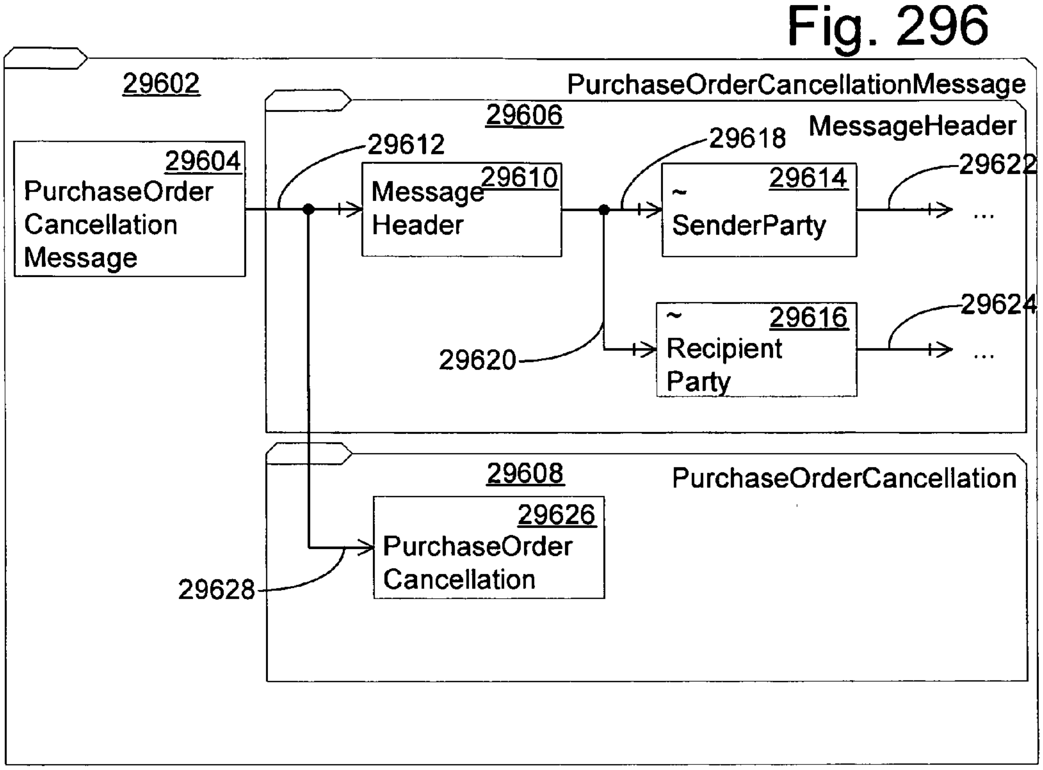
FIG. 296 depicts the data model for the Purchase Order Cancellation interfaces in accordance with methods and systems consistent with the present invention.

As shown in FIGS. 295A-P, PurchaseOrderMessage package 29502 includes MessageHeader package 29506, PurchaseOrder package 29508, and PurchaseOrderMessage entity 29504.

(a) Message Header Package

The MessageHeader package 29506 groups together the business information that is relevant for sending a business document in a message. The MessageHeader package 29506 includes a MessageHeader entity 29510, which groups together the business information from the perspective of the sending application to identify the business document in a message, to provide information about the sender, and to provide any information about the recipient. There is a 1:1 relationship 29512 between the PurchaseOrderMessage entity 29504 and the MessageHeader entity 29510.

The MessageHeader entity 29510 includes a SenderParty entity 29514 and a RecipientParty entity 29516, and is of type GDT BusinessDocumentMessageHeader. There is a 1:c relationship 29518 between the MessageHeader entity 29510 and the SenderParty entity 29514. There is a 1:cn relationship 29520 between the MessageHeader entity 29510 and the RecipientParty entity 29516. Both the SenderParty entity 29514 and the RecipientParty entity 29516 include the same elements as those described below for the BuyerParty entity 29546, as denoted by ellipses 29522 and 29524. The MessageHeader entity 29510 also includes a MessageID, a ReferencedMessageID, and a CreationDateTime. The sending application sets the MessageID. With the ReferencedMessageID, reference is made in the current BusinessDocument to a previous BusinessDocument.

The SenderParty identifies the party responsible for sending a business document at business application level. The SenderParty entity 29514 is of type GDT: BusinessDocumentMessageHeaderParty. The SenderParty entity 29514 may include the name of a contact person for any problems with the message. This is particularly useful if an additional infrastructure (such as a marketplace) is located between the sender and the recipient. The SenderParty entity 29514 is simply used to transfer the message and can be ignored by the receiving application. It should be filled by the sender particularly if the participating parties are not transferred with the PurchaseOrder package.

The RecipientParty identifies the party responsible for receiving a business document at the business application level. The RecipientParty entity 29516 is of type GDT: BusinessDocumentMessageHeaderParty. The RecipientParty entity 29516 may includes the name of a contact person for any problems that occur with the message. This is particularly useful if an additional infrastructure (such as a marketplace) is located between the sender and the recipient. The RecipientParty entity 29516 is simply used to transfer the message and can be ignored by the receiving application. It should be filled by the sender if the PurchaseOrder package cannot be used to transfer the participating parties.

(b) Purchase Order Package

The PurchaseOrder identifies a buyer's request (or a change to or confirmation of such a request) to a seller to provide or deliver certain quantities of products. The PurchaseOrder is divided into PurchaseOrderItems that each specify an ordered product or additional information relevant for such a product, such as information about bills of material ("BOMs") or discount or value limits (see PurchaseOrderItem package). In addition to the buying party and the seller, additional parties can be involved in the PurchaseOrder (see Party package). Locations can be specified for the purchase order delivery (see Location package). Delivery and payment terms are also agreed (see DeliveryInformation package and PaymentInformation package). Notes or references to attachments can be specified for the PurchaseOrder (see Description package and Attachment package). The types of follow-up documents that are expected with regard to the PurchaseOrder package can also be specified (see FollowUpBusinessTransactionDocument package).

The PurchaseOrder package 29508 includes a Party package 29526, a Location package 29528, a DeliveryInformation package 29530, a PaymentInformation package 29532, an Attachment package 29534, a Description package 29536, a FollowUpMessage package 29538, and an Item package 29540. The PurchaseOrder package 29508 also includes a PurchaseOrder entity 29542. There is a 1:1 relationship 29544 between the PurchaseOrderMessage entity 29504 and the PurchaseOrder entity 29542.

The PurchaseOrder entity 29542 is of type GDT: PurchaseOrder, and includes an ID, a SellerID, a BuyerPostingDateTime, a BuyerLastChangeDateTime, a SellerPostingDateTime, a SellerLastChangeDateTime, an AcceptanceStatusCode, a Note and an ItemListCompleteTransmissionIndicator. The ID is a unique identifier specified by the buyer for the purchase order. The SellerID is a unique identifier specified by the seller for the purchase order. The BuyerPostingDateTime is the creation date/time of the purchase order by the buyer, and is of type GDT: DateTime. The BuyerLastChangeDateTime is the date/time of the last change made to the purchase order by the buyer, and is of type GDT: DateTime. The SellerPostingDateTime is the creation date/time of the sales order by the seller, and is of type GDT: DateTime. The SellerLastChangeDateTime is the date/time of the last change made to the sales order by the seller, and is of type GDT: DateTime. The AcceptanceStatusCode is the coded representation for the status of the seller's acceptance of a purchase order, and is of type GDT: AcceptanceStatusCode. The Note is a short description or the title of the purchase order. It is generally used to provide the user with a simple method for searching for a particular purchase order. The Note is of type GDT: Note. The ItemListCompleteTransmissionIndicator specifies whether all purchase order items are always to be transmitted (items that are not transmitted are implicitly classed as cancelled) or whether only new, changed purchase order items that have been cancelled since the last transmission are to be transmitted. The ItemListCompleteTransmissionIndicator is of type GDT: CompleteTransmissionIndicator.

Within any given purchase order, the monetary amounts and prices are in the same currency. The ID is not changed once a purchase order has been created. The SellerID is not changed once a purchase order has been created. The BuyerPostingDateTime is not changed once a purchase order has been created. The BuyerLastChangeDateTime can be changed by the buyer only. The SellerPostingDateTime is not changed once a purchase order has been created. The Note can be changed by the buyer only.

For the message type PurchaseOrderRequest, the SellerID, the SellerPostingDateTime, the SellerLastChangeDateTime, and the AcceptanceStatusCode are not used. In addition, the ItemListCompleteTransmissionIndicator is set to "true," and the ActionCode for all items is set to "01" (Create). The header and all the items that are to be ordered are transmitted, together with all the associated data. Items that were deleted at the buyer before the purchase order was first sent to the seller are not transmitted.

For the message type PurchaseOrderChangeRequest, the SellerID, the SellerPostingDateTime, the SellerLastChangeDateTime, and the AcceptanceStatusCode are not used. If an ItemListCompleteTransmissionIndicator is set to "true," the ActionCode for all items is set to "01" (Create). The header and all the items are transmitted, together with all the associated data. Items that are not transmitted are implicitly classed as cancelled. If an ItemListCompleteTransmissionIndicator is set to "false," the ActionCode for the transmitted items is set to "01" (Create), "02" (Change), or "03" (Delete). The ActionCode "01" (Create) is set if the item is being transmitted for the first time, "02" (Change) if the item has been changed since the last transmission, and "03" (Delete) if the item has been cancelled since the last transmission. The header is transmitted, together with all the associated data. New or changed items are transmitted, together with all the associated data. Cancelled items are transmitted, together with the ID and ActionCode, and should be transmitted without any additional data. Items that are not transmitted are classed as unchanged and are not implicitly classed as cancelled.

For the message type PurchaseOrderConfirmation, the AcceptanceStatusCode at header and item level is set to "AP" (Accepted), "AJ" (Pending), or "RE" (Rejected). If an Item- ListCompleteTransmissionIndicator is set to "true," the ActionCode for all items is set to "01" (Create). The header and all items are transmitted, together with all the associated data. Items that are not transmitted are implicitly classed as cancelled. If an ItemListCompleteTransmissionIndicator is set to "false," the ActionCode for the transmitted items is set to "01" (Create) or "02" (Change). The ActionCode "01" (Create) is set if the item is being transmitted for the first time and "02" (Change) if the item has been changed by the seller since the last transmission. The seller cannot cancel items by setting the ActionCode to "03" (Delete), but can reject items by setting the AcceptanceStatusCode "RE" (Rejected). If the header includes changes, it is transmitted, together with all the associated data. Otherwise, the ID and the AcceptanceStatusCode are transmitted, but not the header data. If an item includes changes, it is transmitted, together with all the associated data, including the ID, ActionCode, AcceptanceStatusCode, ConfirmedNetUnitPrice, and ConfirmedScheduleLines. If the confirmed values in ConfirmedNetUnitPrice or ConfirmedScheduleLine have changed, an item is transmitted, together with the ID, ActionCode, AcceptanceStatusCode, ConfirmedNetUnitPrice, and ConfirmedScheduleLines; the item data should not be transmitted. If the confirmation status has changed, an item is transmitted, together with the ID, ActionCode, and AcceptanceStatusCode. ConfirmedNetUnitPrice and ConfirmedScheduleLines should be transmitted, but not the item data. An unchanged item should not be transmitted. Items that are not transmitted are classed as unchanged and are not implicitly classed as cancelled. If items are not transmitted, the confirmation status "AP" (Accepted) or "RE" (Rejected) is copied from the header to all items, that is, to accept or reject an entire purchase order, only the purchase order number and the AcceptanceStatusCode have to be transmitted at header level.

The PurchaseOrder object in the message data type PurchaseOrderMessage provides a structure that is not used only for purchase order messages but also for changing and confirming a purchase order. The semantic of the PurchaseOrder object is, therefore, more generic in order to cover these aspects.

(i) Purchase Order Party Package

The Party package 29526 groups together all the business parties involved in the PurchaseOrder, and includes a BuyerParty entity 29546, a SellerParty entity 29548, a ProductRecipientParty entity 29550, a VendorParty entity 29552, a ManufacturerParty entity 29554, a BillToParty entity 29556, a PayerParty entity 29558, and a CarrierParty entity 29560. There is a respective 1:c relationship 29562, 29564, 29566, 29568, 29570, 29572, 29574, and 29576 between the PurchaseOrder entity 29542 and the BuyerParty entity 29546, the SellerParty entity 29548, the ProductRecipientParty entity 29550, VendorParty entity 29552, the ManufacturerParty entity 29554, the BillToParty entity 29556, the PayerParty entity 29558, and the CarrierParty entity 29560.

Either only the ID or the ID and address can be transferred for each party. If only the ID is transferred, the ID address defined in the master data is used. If the ID and address are transferred, the ID identifies the party and the address is deemed to be a document address that is different to the master data address. Where possible, the ID and address are to be sent to avoid misunderstandings. The receiving application should implement a suitable optimization strategy to ensure that the system does not create many identical document addresses.

A default logic is used for all business parties: from the header to the items and within item hierarchies. Business parties specified in the header are used for all the items for which a corresponding party is not explicitly transferred and that are directly assigned to the header. In accordance with the same logic, business parties transferred at item level are used for all sub-items assigned to the relevant item in an item hierarchy. The default logic is used for the party as a whole, including the contact party. Parts of a party specified at header level or for a hierarchy item cannot be specified in more detail at item level. The default logic is only a simplified version of the transferred message. As regards logic, parties at header level and for hierarchy items behave as if they have been explicitly transferred for all the sub-items of the message. This also means that if only changed items are transferred rather than all items, the parties are used for the transferred items only. Changes made to parties also always apply to all items relevant for the party in question.

The BuyerParty entity 29546 includes an Address entity 29578 and a Contact entity 29580. There is a 1:c relationship 29582 between the BuyerParty entity 29546 and the Address entity 29578, and a 1:c relationship 29584 between the BuyerParty entity 29546 and the Contact entity 29580.

The Address entity 29578 includes a PersonName entity 29586, an Office entity 29588, a PhysicalAddress entity 29590, a GeoCoordinates entity 29592, and a Communication entity 29594. There is a respective 1:c relationship 29596, 29598, 29500A, 29502A, and 29504A between the Address entity 29578 and the PersonName entity 29586, the Office entity 29588, the PhysicalAddress entity 29590, the GeoCoordinates entity 29592, and the Communication entity 29594.

The Contact entity 29580 includes an Address entity 29506A. There is a 1:c relationship 29508A between the Contact entity 29580 and the Address entity 29506A. The Address entity 29506A includes a PersonName entity 29510A, an Office entity 29512A, a PhysicalAddress entity 29514A, a GeoCoordinates entity 29516A, and a Communication entity 29518A. There is a respective 1:c relationship 29520A, 29522A, 29524A, 295226A, and 29528A between the Address entity 29506A and the PersonName entity 29510A, the Office entity 29512A, the PhysicalAddress entity 29514A, the GeoCoordinates entity 29516A, and the Communication entity 29518A.

The BuyerParty is a party that buys goods or services. The BuyerParty entity 29546 is of type GDT: BusinessTransactionParty. The same BuyerParty entity 29546 is used for all the items in a purchase order, and the BuyerParty entity 29546 is not changed once a purchase order has been created. For the message type PurchaseOrderRequest, the BuyerParty is specified.

Changes can be made to the BuyerParty/Contact and a different BuyerParty/Contact is permitted for each item. Changes can be made to the address of the BuyerParty, but different addresses are not permitted for each item. If a ProductRecipientParty is not explicitly specified in the ordering process, the BuyerParty is also used as the ProductRecipientParty. If a ProductRecipientParty and ShipToLocation are not explicitly specified in the ordering process, the BuyerParty address is used as the ship-to address. If a BillToParty is not explicitly specified in the ordering process, the BuyerParty is also used as the BillToParty. If a BillToParty and PayerParty are not explicitly specified in the ordering process, the BuyerParty is also used as the PayerParty.

The SellerParty is a party that sells goods or services. The SellerParty entity 29548 is of type GDT: BusinessTransactionDocumentParty. The same SellerParty is used for all the items in a purchase order, and the SellerParty is not changed once a purchase order has been created. For the message type PurchaseOrderRequest, the SellerParty is specified. The SellerParty entity 29548 includes the same elements as that described above for the BuyerParty entity 29546 as denoted by ellipse 29530A.

Changes can be made to the SellerParty/Contact and a different SellerParty/Contact is permitted for each item. Changes can be made to the address of the SellerParty, but different addresses are not permitted for each item. If a VendorParty is not explicitly specified in the ordering process, the SellerParty is also used as the VendorParty. If a VendorParty and ShipFromLocation are not explicitly specified in the ordering process, the address of the SellerParty is also used as the ship-from address for the material items.

The ProductRecipientParty is a party to which goods are delivered or for whom services are provided. The ProductRecipientParty entity 29550 is of type GDT: BusinessTransactionDocumentParty. If a ShipToLocation is not explicitly specified in the ordering process, the ProductRecipientParty address is used as the ship-to address. The ProductRecipientParty is not synonymous with the ShipToLocation and should be used only when the ProductRecipientParty (company or person) is actually different than the BuyerParty. The ProductRecipientParty entity 29550 includes the same elements as that described above for the BuyerParty entity 29546 as denoted by ellipse 29532A.

The VendorParty is a party that delivers goods or provides services. The VendorParty entity 29552 is of type GDT: BusinessTransactionDocumentParty. If a ShipFromLocation is not explicitly specified in the ordering process, the address of the VendorParty is used as the ship-from address for the material items. The VendorParty is not the company or person that is solely responsible for transporting the goods. The CarrierParty is responsible for this. The VendorParty is not synonymous with the ShipFromLocation and should be used only when the VendorParty (company or person) is actually different than the SellerParty. The VendorParty entity 29552 includes the same elements as that described above for the BuyerParty entity 29546 as denoted by ellipse 29534A.

The ManufacturerParty is a party that manufactures goods. The ManufacturerParty entity 29554 is of type GDT: BusinessTransactionDocumentParty. The ManufacturerParty entity 29554 can be used for material items only. With regard to the ManufacturerParty entity 29554, the default logic (from header to item to sub-items) is used for material items only; for other items, the ManufacturerParty is ignored. The ManufacturerParty entity 29554 can be used to uniquely define the context of a ManufacturerProductID. The ManufacturerParty entity 29554 includes the same elements as that described above for the BuyerParty entity 29546 as denoted by ellipse 29536A.

The BillToParty is a party to which the invoice for goods or services is sent. The BillToParty entity 29556 is of type GDT: BusinessTransactionDocumentParty. If a PayerParty is not explicitly specified in the ordering process, the BillToParty is also used as the PayerParty. Conversely, the BillToParty is not explicitly derived from the PayerParty. The BillToParty entity 29556 includes the same elements as that described above for the BuyerParty entity 29546 as denoted by ellipse 29538A.

The PayerParty is a party that pays for goods or services. The PayerParty entity 29558 is of type GDT: BusinessTransactionDocumentParty. The PayerParty entity 29558 includes the same elements as that described above for the BuyerParty entity 29546 as denoted by ellipse 29540A.

The CarrierParty is a party that transports goods. The CarrierParty entity 29560 is of type GDT: BusinessTransactionDocumentParty. The CarrierParty entity 29560 can be used for material items. With regard to the CarrierParty entity 29560, the default logic (from header to item to sub-items) is used for material items only. The CarrierParty entity 29560 includes the same elements as that described above for the BuyerParty entity 29546 as denoted by ellipse 29542A.

(ii) Purchase Order Location Package

A Location package 29528 groups together all the locations relevant for the PurchaseOrder, and includes a ShipToLocation entity 29544A and a ShipFromLocation entity 29546A. There is a 1:c relationship 29548A between the PurchaseOrder entity 29542 and the ShipToLocation entity 29544A, and a 1:c relationship 29550A between the PurchaseOrder entity 29542 and the ShipFromLocation entity 29546A.

The ShipToLocation entity 29544A includes an Address entity 29552A. There is a 1:c relationship 29554A between the ShipToLocation entity 29544A and the Address entity 29552A. The Address entity 29552A includes a PersonName entity 29556A, an Office entity 29558A, a PhysicalAddress entity 29560A, a GeoCoordinates entity 29562A, and a Communication entity 29564A. There is a respective 1:c relationship 29566A, 29568A, 29570A, 29572A, and 29574A between the Address entity 29552A and the PersonName entity 29556A, the Office entity 29558A, the PhysicalAddress entity 29560A, the GeoCoordinates entity 29562A, and the Communication entity 29564A. The ShipFromLocation entity 29546A includes the same elements as that described above for the ShipToLocation 29544A as denoted by ellipse 29576A.

A similar default logic to that used for Parties is also used for all locations. Either only the ID or only the address, or both can be transferred for each location. If only the ID is transferred, the ID address defined in the master data is used. If only the address is transferred, it is this address that is used (if necessary, a location is assigned at the address recipient). If the ID and address are transferred, the ID identifies the location and the address is deemed to be a document address that is different to the master data address. Where possible, the ID and address are to be sent to avoid misunderstandings. The receiving application should implement a suitable optimization strategy to prevent many identical document addresses from being created.

The ShipToLocation is the location to which goods are to be delivered or where services are to be provided. The ShipToLocation entity 29544A is of type GDT: BusinessTransactionDocumentShipToLocation.

The ShipFromLocation is the location from which goods are to be shipped. The ShipFromLocation entity 29546A is of type GDT: BusinessTransactionDocumentShipFromLocation. The ShipFromLocation entity 29546A can be used for material items. With regard to the ShipFromLocation entity 29546A, the default logic (from header to item to sub-items) is used for material items only; for all other items, the ShipFromLocation entity 29546A is ignored.

(iii) Purchase Order Delivery Information Package

A DeliveryInformation package 29530 groups together all the information for a delivery required for a purchase order. A similar default logic to that used for Parties is also used for DeliveryTerms. The DeliveryInformation package 29530 includes a DeliveryTerms entity 29578A. There is a 1:c relationship 29580A between the PurchaseOrder entity 29542 and the DeliveryTerms entity 29578A. The DeliveryTerms entity 29578A includes an Incoterms entity 29582A, a PartialDelivery entity 29584A, a QuantityTolerance entity 29586A, a Transport entity 29588A, and a Description entity 29590A. There is a respective 1:c relationship 29592A, 29594A, 29596A, 29598A, and 29500B between the DeliveryTerms entity 29578A and the Incoterms entity 29582A, the PartialDelivery entity 29584A, the QuantityTolerance entity 29586A, the Transport entity 29588A, and the Description entity 29590A.

The DeliveryTerms include the conditions and agreements that are valid for executing the delivery and transporting the ordered goods and for the necessary services and activities. The DeliveryTerms entity 29578A are type GDT: DeliveryTerms. Of the DeliveryTerms, Incoterms and transport can be used for material items. The default logic takes Incoterms and transport into account for material items only. For all other items, Incoterms and transport are ignored.

(iv) Purchase Order Payment Information Package

A PaymentInformation package 29532 groups together all the payment information about the purchase order. The PaymentInformation package 29532 includes a CashDiscountTerms entity 29502B and a PaymentForm entity 29504B. There is a 1:c relationship 29506B between the PurchaseOrder entity 29542 and the CashDiscountTerms entity 29502B, and a 1:c relationship 29508B between the PurchaseOrder entity 29542 and the PaymentForm entity 29504B.

The CashDiscountTerms include the terms of payment in an ordering process. The CashDiscountTerms entity 29502B is of type GDT: CashDiscountTerms. The CashDiscountTerms entity 29502B includes a MaximumDiscount entity 295101B and a NormalDiscount entity 29512B. There is a 1:c relationship 29514B between the CashDiscountTerms entity 29502B and the MaximumDiscount entity 29510B, and a 1:c relationship 29516B between the CashDiscountTerms entity 29502B and the NormalDiscount entity 29512B.

The PaymentForm is the payment form together with the data required. The PaymentForm entity 29504B includes a PaymentFormCode, which is the coded representation of the payment form. The PaymentFormCode entity 29504B is of type GDT: PaymentFormCode. The PaymentFormCode entity 29504B includes a PaymentCard entity 29518B. There is a 1:c relationship 29520B between the PaymentFormCode entity 29504B and the PaymentCard entity 29518B.

The PaymentCard is a credit card or a customer card. The PaymentCard entity 29518B is of type GDT: PaymentCard. The PaymentCard entity 29518B can be used for the payment form PaymentCard (Payment Form Code "02").

(v) Purchase Order Attachment Package

The Attachment package 29534 groups together all the attachment information regarding the purchase order. The Attachment package 29534 includes an Attachment entity 29522B, which is any document that refers to the purchase order. There is a 1:cn relationship 29524B between the PurchaseOrder entity 29542 and the Attachment entity 29522B. The Attachment entity 29522B is of type GDT: Attachment.

(vi) Purchase Order Description Package

The Description package 29536 groups together all the texts regarding the purchase order. The Description package 29536 includes a Description entity 29526B and a ConfirmationDescription entity 29528B. There is a 1:c relationship 29530B between the PurchaseOrder entity 29542 and the Description entity 29526B, and a 1:c relationship 29532B between the PurchaseOrder entity 29542 and the ConfirmationDescription entity 29528B.

The Description is a natural-language text regarding the purchase order, which is visible to business parties. The Description entity 29526B is of type GDT: Description. The Description entity 29526B can be used for all types of textual information about the transferred purchase order and not just the current message. An example of this would be information stating that the Purchasing employee responsible is on vacation as of a specific date, and indicating the name and telephone number of a substitute as of this date.

The ConfirmationDescription is a natural-language text regarding the order confirmation, which is visible to business parties. The ConfirmationDescription entity 29528B is of type GDT: Description. The ConfirmationDescription entity 29528B in the message type PurchaseOrderRequest is not used. The ConfirmationDescription entity 29528B in the message type PurchaseOrderChangeRequest is not used. The ConfirmationDescription entity 29528B can be used for all types of textual information about the order confirmation. An example of this would be the seller's justification for rejecting a particular purchase order.

(vii) Purchase Order Follow Up Message Package

The FollowUpMessage package 29538 groups together all the information about subsequent messages that the buyer expects to receive from the seller with regard to the purchase order. The FollowUpMessage package 29538 includes a FollowUpPurchaseOrderConfirmation entity 29534B, a FollowUpDespatchedDeliveryNotification entity 29536B, a FollowUpServiceAcknowledgementRequest entity 29538B, and a FollowUpInvoiceRequest entity 29540B. There is a respective 1:c relationship 29542B, 29544B, 29546B, and 29548B between the PurchaseOrder entity 29542 and the FollowUpPurchaseOrderConfirmation entity 29534B, the FollowUpDespatchedDeliveryNotification entity 29536B, the FollowUpServiceAcknowledgementRequest entity 29538B, and the FollowUpInvoiceRequest entity 29540B.

The FollowUpPurchaseOrderConfirmation includes information about whether and in what form the buyer expects to receive confirmation of the purchase order from the seller. The FollowUpPurchaseOrderConfirmation entity 29534B includes a RequirementCode, which is a coded representation of information about whether the buyer expects to receive confirmation of the purchase order from the seller. The RequirementCode is of type GDT: FollowUpMessageRequirementCode. The values "02" (Expected) and "04" (Unexpected) are permitted for the RequirementCode, and the RequirementCode can be changed by the buyer. If the buyer changes the RequirementCode from "Unexpected" to "Expected" during an ordering process, the seller should send the current confirmation status, even for purchase order items that have already been delivered or invoiced. If the buyer changes the RequirementCode from "Expected" to "Unexpected," the seller should not send any more confirmations, except if the purchase order is cancelled or if the seller changes it. The seller can transfer the order confirmation either electronically using a PurchaseOrderConfirmation message or by traditional methods of communication, such as e-mail or fax.

The FollowUpDespatchedDeliveryNotification includes information about whether the buyer wants to be informed by the seller of any outbound deliveries, and includes a RequirementCode. The RequirementCode is a coded representation of information about whether the buyer expects the seller to send notification of any outbound deliveries of the ordered goods. The RequirementCode is of type GDT: FollowUpMessageRequirementCode. Only the values "02" (Expected) and "04" (Unexpected) are permitted for the RequirementCode, and the RequirementCode can be changed by the buyer only. If the buyer changes the RequirementCode from "Unexpected" to "Expected" during an ordering process, the seller should inform the buyer of all the new outbound deliveries for the purchase order once the change has been received. If the buyer changes the RequirementCode from "Expected" to "Unexpected," the seller should not send any further information about outbound deliveries. The seller can transfer the confirmation of the outbound delivery either electronically using a DespatchedDeliveryNotification message or by traditional methods of communication, such as e-mail or fax. Confirmation of the outbound delivery can be sent for material items only, that is, the RequirementCode "Expected" can be ignored for service items.

The FollowUpServiceAcknowledgementRequest includes information about whether the buyer wants to be informed by the seller of any services provided, and includes a RequirementCode. The RequirementCode is a coded representation of information about whether the buyer wants to be informed by the seller of any services provided. The RequirementCode is of type GDT: FollowUpMessageRequirementCode. Only the values "02" (Expected) and "04" (Unexpected) are permitted for the RequirementCode, and the RequirementCode can be changed by the buyer only. If the buyer changes the RequirementCode from "Unexpected" to "Expected" during an ordering process, the seller should inform the buyer of all the new services provided once the change has been received. If the buyer changes the RequirementCode from "Expected" to "Unexpected," the seller should not send any further information about services provided. The seller can transfer the confirmation of the services either electronically using a ServiceAcknowledgementRequest message or by traditional methods of communication, such as e-mail or fax. In addition to service items, a confirmation of a service can also contain planned or unplanned material items for materials that were required when the service was provided.

The FollowUpInvoiceRequest includes information about whether the buyer expects to receive an invoice from the seller, and includes a RequirementCode and an EvaluatedReceiptSettlementIndicator. The RequirementCode is a coded representation of information about whether the buyer expects to receive an invoice from the seller. The RequirementCode is of type GDT: FollowUpMessageRequirementCode. The EvaluatedReceiptSettlementIndicator indicates whether or not the purchase order settlement is to be processed automatically by the goods receipt, without an invoice. The EvaluatedReceiptSettlement Indicator is of type GDT: EvaluatedReceiptSettlementIndicator. Only the values "01" (Required) and "05" (Forbidden) are permitted for the RequirementCode. If the Evaluated ReceiptSettlementIndicator is set to "true," the RequirementCode is set to "Forbidden." The RequirementCode and the EvaluatedReceiptSettlementIndicator can be changed by the buyer only. If the buyer changes the RequirementCode from "Forbidden" to "Required" during an ordering process, the buyer and seller agree upon what exactly has to be invoiced. If the buyer changes the RequirementCode from "Required" to "Forbidden," the seller cannot send any further invoices once the change has been received. The seller can transfer the invoice either electronically using an InvoiceRequest message or by traditional methods of communication, such as mail or fax. Whether or not the buyer expects to receive an invoice from the seller does not depend on the type of payment method. There are two typical cases in which the buyer does not expect to receive an invoice from the seller: (1) the purchase orders for goods that are free-of-charge, such as test samples; and (2) the purchase orders that are to be settled using the evaluated receipt settlement (ERS) procedure.

(viii) Purchase Order Item Package

The PurchaseOrderItem package 29540 includes a ProductInformation package 29550B, a PriceInformation package 29552B, a Batch package 29554B, a Configuration package 29556, a Party package 29558B, a Location package 29560B, a DeliveryInformation package 29562B, a BusinessTransactionDocumentReference package 29564B, an Attachment package 29566B, a Description package 29568B, and a ScheduleLine package 29570B.

The Item package 29540 includes an Item entity 29572B. There is a 1:cn relationship 29574B between the PurchaseOrder entity 29542 and the Item entity 29572B. The Item entities are arranged hierarchically using a Hierarchy Relationship 29576B. The Hierarchy Relationship 29576B is the relationship between a sub-item and a higher-level parent item in an item hierarchy. There is a 1:cn relationship 29578B between the Item entity 29572B and its subordinate entities, and there is a 1:c relationship 29580B between the Item entity 29572B and its superordinate entities.

The Item specifies a product ordered by the PurchaseOrder or additional information about such a product. This information includes specifications on discounts in kind, substitute products, and value limits. The PurchaseOrderItem entity 29572B includes detailed information about a particular product (see ProductInformation package) and its price (see Price Information package). The quantity of the product and (delivery) dates are specified in the schedule line (see ScheduleLine package). For the PurchaseOrderItem (compared to the information of the PurchaseOrder), deviating parties, locations, and delivery terms can be defined (see Party package, Location package, and DeliveryInformation package). The PurchaseOrderItem can contain references to other business documents that are relevant for the item (see BusinessTransactionDocumentReference package). Notes or references to attachments can also be specified for the item (see Description package and Attachment package).

The PurchaseOrderItem entity 29572B can be subordinate to another PurchaseOrderInformationItem within a hierarchy to represent a business relationship between the two items. This could be information about a discount in kind or substitute product for an ordered product, for example. This relationship can also be used to group together PurchaseOrder items, that is, a PurchaseOrderItem can group together other PurchaseOrderItems. The PurchaseOrderItem entity 29572B is of type GDT: PurchaseOrderItem.

The PurchaseOrderItem entity 29572B includes an ID, a SellerID, and ActionCode, an AcceptanceStatusCode, and an UnplannedItemPermissionCode. The ID is the identifier assigned by the buyer to a purchase order item. The identifier is unique within a particular purchase order. The ID is of type GDT: BusinessTransactionDocumentItemID. The SellerID is the identifier assigned by the seller to a purchase order item. The identifier is unique within a particular purchase order. The SellerID is of type GDT: BusinessTransactionDocumentItemID. The ActionCode is the coded representation of the actions used to create, change, and delete items in an ordering process at the message recipient. The ActionCode is of type GDT: ActionCode. The AcceptanceStatusCode is the coded representation for the status of the seller's acceptance of a purchase order. The UnplannedItemPermissionCode specifies whether unplanned service entry, goods receipt, and invoice items are permitted for a purchase order item later on in the process. The UnplannedItemPermissionCode is of type GDT: UnplannedItemPermissionCode. The PurchaseOrderItem includes a HierarchyRelationship.

The ID is not changed once an item has been created. The SellerID is not changed once an item has been created. The UnplannedItemPermissionCode is not changed once an item has been created.

For the message type PurchaseOrderRequest, the SellerID and the AcceptanceStatusCode are not used. For the message type PurchaseOrderChangeRequest, the AcceptanceStatusCode is not used.

From a semantic point of view, items can contain other items. This enables item hierarchies to be mapped. From a technical point of view, the item type is not defined recursively, since this cannot be handled by some commonly-used XML tools. The hierarchies are mapped using the entity HierarchyRelationship.

There are various item categories, which are governed by a variety of constraints. An item can have several constraint types. In this case, the item satisfies all the constraints of all its constraint types. Which constraint types can be combined with one another and how, is specified in the description of the constraint types. The constraint types are the Standard items, the Hierarchy items, the Sub-items, the Material items, the Service items, the Unspecified product items, the Grouping hierarchy items, the BOM hierarchy items, the BOM hierarchy items, the Discount in kind hierarchy items, and the Limit items.

Standard items are all the items to which no lower-level items have been assigned in the hierarchy. An item that is not referenced by another item, using the ParentItemID is a standard item.

Hierarchy items are items to which at least one other lower-level item has been assigned in the hierarchy. An item that is referenced by at least one other item, using the ParentItemID is a hierarchy item. All items are either standard or hierarchy items.

Sub-items are items that have been assigned below a hierarchy item and not directly to the purchase order header. Sub-items can be both standard items and hierarchy items. A sub-item is an item that references another item, using the ParentItemID.

Material items are items whose product is a material. Items whose ProductTypeCode is “1” (Material) are material items. Service items are items whose product is a service. Items whose ProductTypeCode is “2” (Service) are service items.

Unspecified product items are items for which it is not specified whether they refer to a material or a service. Items whose ProductTypeCode is not specified are unspecified product items. All items are either material, service, or unspecified product items. An unspecified product item satisfies all the constraints of a material, service, or limit item.

Grouping hierarchy items are hierarchy items that logically group together other items. Multilevel grouping hierarchies are permitted, that is, a grouping hierarchy item can contain sub-items that are also grouping hierarchy items. Hierarchy items whose sub-items all have HierarchyRelationshipTypeCode “002” (Group) are grouping hierarchy items; sub-items with a different HierarchyRelationshipTypeCode are not permitted. Grouping hierarchy items are not permitted as sub-items of other types of hierarchy items.

Substitute product hierarchy items are hierarchy items for which at least one sub-item with a substitute product exists. Multilevel substitute product hierarchies are not permitted, that is, a substitute product cannot be substituted. Hierarchy items whose sub-items all have the HierarchyRelationshipTypeCode “006” (Substitute Product) are substitute product hierarchy items; sub-items with a different HierarchyRelationshipTypeCode are not permitted. Substitute product hierarchy items can be used as sub-items in grouping hierarchies only. Substitute product sub-items can be transferred in the PurchaseOrderConfirmation message only. The buyer can reject proposed substitute products only by cancelling the entire associated substitute product hierarchy item.

BOM hierarchy items are hierarchy items that group together other items in a BOM. Multilevel BOM hierarchies are permitted. Hierarchy items with at least one sub-item with HierarchyRelationshipTypeCode “001” (Bill of Material) are BOM hierarchy items; additional sub-items are permitted with the HierarchyRelationshipTypeCode “003” (Discount in Kind) only.

Discount in kind hierarchy items are hierarchy items for which a goods discount is granted in the form of an inclusive or exclusive bonus quantity. Multilevel discount in kind hierarchies are not permitted, that is, no discount in kind can be granted for discount in kind. The goods discount is described in the form of one or more sub-items in the discount in kind hierarchy item. Hierarchy items with at least one sub-item with HierarchyRelationshipTypeCode “003” (Discount in Kind) are discount in kind hierarchy items; additional sub-items are permitted with the HierarchyRelationshipTypeCode “001” (Bill of Material) only. All hierarchy items are grouping, BOM, or discount in kind hierarchy items. A hierarchy item can be both a BOM and discount in kind hierarchy item, if a discount in kind has been granted for a BOM.

Limit items are both standard and unspecified product items for which the exact requirements are unknown at the time of ordering. Items with an UnplannedItemPermissionCode set to “02” (WithContractReferenceOnly) or “03” (Allowed) are limit items. Limit items are not permitted to be sub-items of BOM or discount in kind hierarchy items. No substitute product sub-items are permitted for limit items.

Dependencies between elements or entities of this item category are described under “Notes” for the relevant element or entity. If a BOM or discount in kind hierarchy item is cancelled in an ordering process, all the sub-items are automatically classed as cancelled. If a grouping hierarchy item is cancelled, only the grouping is classed as cancelled; the sub-items remain valid and are explicitly cancelled individually, if required.

(a) Hierarchy Relationship

A HierarchyRelationship is the relationship between a sub-item and a higher-level parent item in an item hierarchy, and includes a ParentItemID, a ParentItemSellerID, and a TypeCode. The ParentItemID is the reference to the parent item with the item number assigned by the buyer. The ParentItemID is of type GDT: BusinessTransactionDocumentItemID. The ParentItemSellerID is the reference to the parent item with the item number assigned by the seller. The ParentItemSellerID is of type GDT: BusinessTransactionDocumentItemID. The TypeCode represents the hierarchical relationship between the sub-item and its higher-level parent item. The TypeCode is of type GDT: BusinessTransactionDocumentItemHierarchyRelationshipTypeCode.

The ParentItemID is not changed once an item has been created. The ParentItemSellerID is not changed once an item has been created. Either the ParentItemID or the ParentItemSellerID is specified. The TypeCode is not changed once an item has been created.

(b) Purchase Order Item Product Information Package

The ProductInformation package 29550B groups together all the information for identifying, describing, and classifying a product in an ordering process. The ProductInformation package 29550B includes a Product entity 29582B and a ProductCategory entity 29584B. There is a 1:c relationship 29586B between the Item entity 29572B and the Product entity 29582B, and a 1:c relationship 29588B between the Item entity 29572B and the ProductCategory entity 29584B. The ProductInformation package 29550B is not used in grouping hierarchy items.

The Product includes the details about a product as generally understood from a commercial point of view in business documents. These are the details for identifying a product and product type, and the description of the product. The Product entity 29582B is of type GDT: BusinessTransactionDocumentProduct.

For limit items, the description (Note) can be used in the Product; the product number and ProductTypeCode are not used. The ordered product can be changed by the buyer only. The seller can only add a product number to a product description without product number or specify a product for a new item that he/she has proposed. The ProductTypeCode is not changed once an item has been created. With the exception of grouping hierarchy items, at least the product number or the product description (Note) is specified when a new item is created. If both the product number and description are specified, the description is merely additional information in the message and can be ignored by the recipient. In substitute product sub-items, the ProductTypeCode is the same as the parent item ProductTypeCode.

A product is either a tangible or intangible good, and is a part of the business activities of a company. It can be traded and contributes directly or indirectly to value added. In substitute product sub-items, the product is the substitute product proposed by the vendor for the product ordered in the associated substitute product hierarchy item.

The ProductCategory includes the details about a product category as generally understood from a commercial point of view in business transaction documents. The ProductCategory entity 29584B includes details for identifying the product category using an internal ID, a standard ID, and IDs assigned by involved parties. The ProductCategory entity 29584B is of type GDT: BusinessTransactionDocumentProductCategory. A product category is a division of products according to objective criteria. The product category is derived directly from the product if a product number is specified for the product. It can differ for the buyer and seller if they have classified the same product differently. This is allowed and should be tolerated by the systems involved.

(c) Purchase Order Item Price Information Package

The PriceInformation package 29552B groups together all the price information in a purchase order item. The PriceInformation package 29552B includes a Price entity 29590B and a ConfirmedPrice entity 29592B. There is a 1:c relationship 29594B between the Item entity 29572B and the Price entity 29590B, and a 1:c relationship 29596B between the Item entity 29572B and the ConfirmedPrice entity 29592B. The PriceInformation package 29552B is not used in grouping hierarchy, limit, and discount in kind items. The PriceInformation package 29552B for a purchase order item includes only prices; it does not contain any information about how the prices are calculated (pricing scales, and so on).

The Price is the purchase order price specified by the buyer. The Price entity 29590B includes the NetUnitPrice. The NetUnitPrice is the net price specified by the buyer for the base quantity (without tax or cash discount) of the product. The NetUnitPrice is of type GDT: Price.

The Price entity 29590B can be changed by the buyer. In BOM hierarchies, the following rules apply for the Price: (1) If the price is specified for the item at the top of the BOM hierarchy and not for the sub-items, this price applies; (2) If the price is specified for standard items (end nodes in the hierarchy tree) in the BOM hierarchy, these prices apply. The price of the entire BOM is the total of the individual prices; and (3) If a price is specified at different levels in the BOM hierarchy, the price that appears above all the others in the tree always applies. Differences between the total of the individual prices and the price at the next highest hierarchy level are permissible. These may be caused by discounts for the entire BOM. In substitute product sub-items, the Price can be used to transfer substitute product prices. The same rules apply here as for the Price in BOM hierarchies.

The ConfirmedPrice is the purchase order price confirmed by the seller. The ConfirmedPrice entity 29592B includes a NetUnitPrice, which is the net price (without tax or cash discount) confirmed by the seller for the base quantity of the product. The NetUnitPrice is of type GDT: Price. The ConfirmedPrice for the message type PurchaseOrderRequest is not used. The ConfirmedPrice for the message type PurchaseOrderChangeRequest is not used. In BOM and substitute product hierarchies, the same rules apply for the ConfirmedPrice as for the Price.

(d) Purchase Order Item Batch Package

The Batch package 29554B includes Batch entity 29598B. There is a 1:c relationship 29500C between the Item entity 29572B and the Batch entity 29598B. The Batch entity 29598B includes a PropertyValuation entity 29502C. There is a 1:cn relationship 29504C between the Batch entity 29598B and the PropertyValuation entity 29502C. The PropertyValuation entity 29502C includes a PropertyValues entity 29506C. There is a 1:1 relationship 29508C between the PropertyValuation entity 29502C and the PropertyValues entity 29506C.

The PropertyValues entity 29506C includes an AmountSpecification entity 29510C, a MeasureSpecification entity 29512C, a QuantitySpecification entity 29514C, a NumericSpecification entity 29516C, a FloatSpecification entity 29518C, an IntegerSpecification entity 29520C, a DateSpecification entity 29522C, a TimeSpecification entity 29524C, a DateTimeSpecification entity 29526C, a NameSpecification entity 29528C, an IndicatorSpecification entity 29530C, and an AttachmentWebAddress entity 29532C. There is a respective 1:cn relationship 29534C, 29536C, 29538C, 29540C, 29542C, 29544C, 29546C, 29548C, 29550C, 29552C, and 29554C between the PropertyValues entity 29506C and the AmountSpecification entity 29510C, the MeasureSpecification entity 29512C, the QuantitySpecification entity 29514C, the NumericSpecification entity 29516C, the FloatSpecification entity 29518C, the IntegerSpecification entity 29520C, the DateSpecification entity 29522C, the TimeSpecification entity 29524C, the DateTimeSpecification entity 29526C, the NameSpecification entity 29528C, and the IndicatorSpecification entity 29530C. There is a 1:c relationship 29556C between the PropertyValues entity 29506C and the AttachmentWebAddress entity 29532C.

(e) Purchase Order Item Configuration Package

The Configuration package 29556B includes a Configuration entity 29558C. There is a 1:c relationship 29560C between the Item entity 29572B and the Configuration entity 29558C.

(f) Purchase Order Item Party Package

The PurchaseOrderItemParty package 29558B includes a BuyerParty entity 29562C, a SellerParty entity 29563C, a ProductRecipientParty entity 29564C, a VendorParty entity 29566C, a ManufacturerParty entity 29568C, a BillToParty entity 29570C, a PayerParty entity 29572C, and a CarrierParty entity 29574C. There is a respective 1:c relationship 29575C, 29576C, 29577C, 29578C, 29580C, 29582C, 29584C and 29586C between the Item entity 29572B and the ProductRecipientParty entity 29564C, the VendorParty entity 29566C, the ManufacturerParty entity 29568C, the BillToParty entity 29570C, the PayerParty entity 29572C, and the CarrierParty entity 29574C. Each of the ProductRecipientParty entity 29564C, the VendorParty entity 29566C, the ManufacturerParty entity 29568C, the BillToParty entity 29570C, the PayerParty entity 29572C, and the CarrierParty entity 29574C includes the same elements as those described above for the BuyerParty entity 29546 as denoted by ellipses 29587C, 29588C, 29589C, 29590C, 29592C, 29594C, 29596C and 29598C.

(g) Purchase Order Item Location Package

The PurchaseOrderItemLocation package 29560B includes a ShipToLocation entity 29500D and a ShipFromLocation entity 29502D. There is a 1:c relationship 29504D between the Item entity 29572B and the ShipToLocation entity 29500D, and a 1:c relationship 29506D between the Item entity 29572B and the ShipFromLocation entity 29502D. Each of the ShipToLocation entity 29500D and the ShipFromLocation entity 29502D includes the same elements as those described above for the ShipToLocation 29544A as denoted by ellipses 29508D and 29510D.

(h) Purchase Order Item Delivery Information Package

The PurchaseOrderItemDeliveryInformation package 29562B includes a DeliveryTerms entity 29512D. There is a 1:c relationship 29514D between the Item entity 29572B and the DeliveryTerms entity 29512D. The DeliveryTerms entity 29512D includes an Incoterms entity 29516D, a PartialDelivery entity 29518D, a QuantityTolerance entity 29520D, a Transport entity 29522D, and a Description entity 29524D. There is a respective 1:c relationship 29526D, 29528D, 29530D, 29532D and 29534D between the DeliveryTerms entity 29512D and the Incoterms entity 29516D, the PartialDelivery entity 29518D, the QuantityTolerance entity 29520D, the Transport entity 29522D, and the Description entity 29524D.

(i) Purchase Order Item Business Transaction Document Reference Package

The BusinessTransactionDocumentReference package 29564B groups together all the references to business documents that are relevant for the PurchaseOrderItem and have a business relationship with the item, and includes a QuoteReference, a PurchaseContractReference, a SalesContractReference, an OriginPurchaseOrderReference, a BuyerProductCatalogueReference, and a SellerProductCatalogueReference. None of the entities in the BusinessTransactionDocumentReference package can be used in grouping hierarchy items.

If possible, individual items in business documents should be referenced in the purchase order messages from item level (quotation item 10 in quotation 4711 is directly referenced from purchase order item 1, for example). If an item assignment is not recognized, an entire document can be referenced (quotation 4711 is referenced in its entirety from purchase order item 1, for example). In this case, the recipient cannot demand that the item numbers in both documents be the same (that item 1 in purchase order 4712 be the same as item 1 in quotation 4711, for example). It is the responsibility of the recipient to try to make this assignment using other criteria that are not necessarily unique, such as the product number. References are only used for establishing relationships between different documents. If a reference has been provided, all the data relevant to the purchase order is still transferred from the document referenced in the purchase order message (the product number in a purchase order item is transferred even if the product number can be derived directly from a bid reference). The data in the purchase order message can differ in any number of ways from the referenced documents. The recipient is able to respond appropriately to such deviations.

The BusinessTransactionDocumentReference package 29564B includes a QuoteReference entity 29536D, a PurchaseContactReference entity 29538D, a SalesContractReference entity 29540D, an OriginPurchaseOrderReference entity 29542D, a BuyerProductCatalogueReference entity 29544D, and a SellerProductCatalogueReference entity 29546D. There is a 1:c relationship 29548D between the Item entity 29572B and the QuoteReference entity 29536D. There is a 1:cn relationship 29550D between the Item entity 29572B and the PurchaseContactReference entity 29538D. There is a 1:cn relationship 29552D between the Item entity 29572B and the SalesContractReference entity 29540D. There is a 1:c relationship 29554D between the Item entity 29572B and the OriginPurchaseOrderReference entity 29542D. There is a 1:c relationship 29556D between the Item entity 29572B and the BuyerProductCatalogueReference entity 29544D. There is a 1:c relationship 29558D between the Item entity 29572B and the SellerProductCatalogueReference entity 29546D.

A QuoteReference is a reference to a quotation or an item within a quotation. The QuoteReference entity 29536D is of type GDT: BusinessTransactionDocumentReference. A QuoteReference can reference one item, that is, one ItemID is permissible.

A PurchaseContractReference is a reference to a purchase contract or item in a purchase contract. The PurchaseContractReference entity 29538D is of type GDT: BusinessTransactionDocumentReference. In limit items, multiple contract references are possible; a maximum of one contract reference is permissible in all other item types. A PurchaseContractReference can reference one item only, that is, only one ItemID is permissible. Unless otherwise agreed, the seller is responsible for determining the correct SellerContractReference for a specified PurchaseContractReference.

A SalesContractReference is a reference to a sales contract or an item within a sales contract. The SalesContractReference entity 29540D is of type GDT: BusinessTransactionDocumentReference. A SalesContractReference can reference one item, that is, one ItemID is permissible. In limit items, multiple contract references are possible; a maximum of one contract reference is permissible in all other item types.

An OriginPurchaseOrderReference is a reference to the origin purchase order or to an item within the origin purchase order in a third-party deal. The OriginPurchaseOrderReference entity 29542D is of type GDT: BusinessTransactionDocumentReference. An OriginPurchaseOrderReference can reference one item, that is, one ItemID is permissible. The OriginPurchaseOrderReference is used only for third-party purchase orders. The OriginPurchaseOrderReference is used in all the purchase orders in a third-party deal, so that the seller can reference the original purchase order of the ProductRecipientParty with the OriginPurchaseOrderReference when the delivery is made.

A BuyerProductCatalogueReference is a reference to the buyer's product Catalogue or an item within the buyer's product catalogue. The BuyerProductCatalogueReference entity 29544D is of type GDT: CatalogueReference. A BuyerProductCatalogueReference can reference one item, that is, one ItemID is permissible. The BuyerProductCatalogueReference should be filled if a purchase order item refers to a Catalogue whose number and item numbers were assigned by the buyer. In the ordering process, the BuyerProductCatalogueReference can be used as a substitute product number if the product is defined in a Catalogue only rather than having its own master record.

A SellerProductCatalogueReference is a reference to the seller's product Catalogue or an item within the seller's product catalogue. The SellerProductCatalogueReference entity 29546D is of type GDT: CatalogueReference. A SellerProductCatalogueReference can reference one item, that is, one ItemID is permissible. The SellerProductCatalogueReference should always be filled if a purchase order item refers to a Catalogue whose number and item numbers were assigned by the seller. In the ordering process, the SellerProductCatalogueReference can be used as a substitute product number if the product is defined in a Catalogue only rather than having its own master record.

(1) Purchase Order Item Attachment Package

The PurchaseOrderItemAttachment package 29566B includes an Attachment entity 29560D. There is a 1:cn relationship 29562D between the Item entity 29572B and the Attachment entity 29560D.

(k) Purchase Order Item Description Package

The Description package 29568B groups together all the explanatory texts regarding a purchase order item. The Description package 29568B includes a Description entity 29564D and a ConfirmationDescription entity 29566D. There is a 1:c relationship 29568D between the Item entity 29572B and the Description entity 29564D, and there is a 1:c relationship 29570D between the Item entity 29572B and the ConfirmationDescription entity 29566D.

The Description is a natural-language text regarding a purchase order item, which is visible to business parties. The Description entity 29564D is of type GDT: Description. The Description can be used for all types of textual information about the purchase order item. An example is an accurate description of a fault in need of repair.

The ConfirmationDescription is a natural-language text regarding a purchase order item, which is visible to business parties. The ConfirmationDescription entity 29566D for the message type Purchase Order Request is of type GDT: Description. The ConfirmationDescription entity 29566D for the Message Type PurchaseOrderRequest is not used. The ConfirmationDescription entity 29566D for the message type PurchaseOrderChangeRequest is not used. The ConfirmationDescription can be used for all types of textual information about an item in an order confirmation. An example of this would be the seller's justification for rejecting a particular purchase order item.

(1) Purchase Order Item Schedule Line Package

The ScheduleLine package 29570B groups together all the quantity and date information about a PurchaseOrderItem, and includes a ScheduleLine entity 29572D and a ConfirmedScheduleLine entity 29574D. There is a 1:n relationship 29576D between the Item entity 29572B and the ScheduleLine entity 29572D, and a 1:cn relationship 29578D between the Item entity 29572B and the ConfirmedScheduleLine entity 29574D.

ScheduleLine entity 29572D includes a DeliveryPeriod entity 29580D. There is a 1:1 relationship 29582D between the ScheduleLine entity 29572D and the DeliveryPeriod entity 29580D.

ConfirmedScheduleLine entity 29574D includes a DeliveryPeriod entity 29584D. There is a 1:1 relationship 29586D between the ConfirmedScheduleLine entity 29574D and the DeliveryPeriod entity 29584D.

There is no direct relationship between a ScheduleLine and a ConfirmedScheduleLine. This has the advantage that the case "10 pieces for 01/01 and 10 pieces for 02/01" ordered as "20 pieces for 02/01" can be confirmed simply and without interpretation on the part of the applications.

The ScheduleLine is a line containing the quantity and date of a performance schedule required by the buyer for a purchase order. The ScheduleLine entity 29572D is of type GDT: PurchaseOrderItemScheduleLine. The ScheduleLine includes an ID, a SellerID, a DeliveryPeriod and a Quantity. The ID is the ScheduleLine number assigned by the procurement system. The ID is of type GDT: ScheduleLineID. The SellerID is the ScheduleLine number assigned by the sales system. The SellerID is of type GDT: ScheduleLineID. The DeliveryPeriod is the period in which the buyer expects a product to be delivered or service provided. The DeliveryPeriod is of type GDT: DateTimePeriod. The Quantity is the purchase order quantity. The Quantity is of type GDT: Quantity.

Multiple ScheduleLines for a purchase order item with identical DeliveryPeriod are not permitted. All the ScheduleLines for a particular item use the same unit of measure. ScheduleLines is not used for grouping hierarchy items. In this case, the ScheduleLines is explicitly specified for all sub-items. ScheduleLines do not have to be specified for limit items. At least one ScheduleLine is specified for all other item types. Within a ScheduleLine, the quantity is not used for limit items; for all other types of items, the quantity is specified. In the ScheduleLines of sub-items for discount in kind and BOM hierarchy items, the DeliveryPeriod of all the sub-items is identical to the DeliveryPeriod of the relevant parent items. The DeliveryPeriod can be changed by buyers only. Sellers can specify a DeliveryPeriod only for new items they have proposed. In the ScheduleLines of substitute product sub-items, the DeliveryPeriod of all the sub-items is identical to the DeliveryPeriod of the relevant parent items. The quantities and confirmed quantities of the sub-items should be added to the quantities of the parent items; where deviations occur, the quantities of sub-items are regarded as the valid quantities. The ID is optional; a procurement system does not have to number the ScheduleLines. The SellerID is optional; a sales system does not have to number the ScheduleLines. The Quantity can be changed explicitly by the buyer and the seller.

The ConfirmedScheduleLine is a line containing the quantity and date of a performance schedule confirmed by the seller for a purchase order. The ConfirmedScheduleLine entity 29574D is of type GDT: PurchaseOrderItemScheduleLine. The ConfirmedScheduleLine includes an ID, a SellerID, a DeliveryPeriod, and a Quantity. The ID is the ConfirmedScheduleLine number assigned by the procurement system. The ID is of type GDT: ScheduleLineID. The SellerID is the ConfirmedScheduleLine number assigned by the sales system. The SellerID is of type GDT: ScheduleLineID. The DeliveryPeriod is the period in which the seller provides the buyer with confirmation of a delivery or the provision of a service. The DeliveryPeriod is of type GDT: DateTimePeriod. The Quantity is the quantity confirmed by the seller. The Quantity is of type GDT: Quantity.

Multiple ConfirmedScheduleLines are not permitted for a purchase order item with identical DeliveryPeriod. All the ConfirmedScheduleLines for a particular item use the same unit of measure. The same rules apply for the use of the ConfirmedScheduleLine for the various item types as described for the ScheduleLine.

For the message type PurchaseOrderRequest, the ConfirmedScheduleLine is not used. For the message type PurchaseOrderChangeRequest, the ConfirmedScheduleLine is not used.

Confirmation of a partial quantity does not mean cancellation of the remaining quantity. It simply means that the seller has agreed to this partial quantity only and has not yet made a decision about the remaining quantity. In order to explicitly cancel a remaining quantity; the seller reduces the quantity of the ScheduleLine (not that of the ConfirmedScheduleLine) accordingly. The SellerID is optional; a sales system does not have to number the ConfirmedScheduleLines.

(4) Message Data Type Purchase Order Cancellation Message

The message data type PurchaseOrderCancellationMessage groups together the business information that is relevant for sending a business document in a message and the PurchaseOrderCancellation object in the business document. The message data type PurchaseOrderCancellationMessage includes a PurchaseOrderCancellationMessage package 29602, which includes a PurchaseOrderCancellationMessage entity 29604, a BusinessDocumentMessageHeader package 29606 and a PurchaseOrderCancellation package 29608. The message data type PurchaseOrderMessage makes the structure available for the message types PurchaseOrderCancellationRequest and the relevant interfaces.

The MessageHeader package 29606 includes a MessageHeader entity 29610. There is a 1:c relationship 29612 between the PurchaseOrderCancellationMessage entity 29604 and the MessageHeader entity 29610. The ReferenceID element of the BusinessDocumentMessageHeader entity establishes the reference to the purchase order to be cancelled.

The MessageHeader entity 29610 includes a SenderParty entity 29614 and a RecipientParty entity 29616. There is a 1:c relationship 29618 between the MessageHeader entity 29610 and the SenderParty entity 29614. There is a 1:c relationship 29620 between the MessageHeader entity 29610 and the RecipientParty entity 29616. The SenderParty entity 29614 and the RecipientParty entity 29616 include the same elements as those described for the Party entity in the Purchase Order Message as denoted by ellipses 29622 and 29624.

A PurchaseOrderCancellation package 29608 groups together the PurchaseOrderCancellation data type, which is a buyer's request to a seller to cancel a purchase order. PurchaseOrderCancellation package 29608 includes a PurchaseOrderCancellation entity 29626. There is a 1:1 relationship 29628 between the PurchaseOrderCancellationMessage entity 29604 and the PurchaseOrderCancellation entity 29626. The PurchaseOrderCancellation entity 29626 includes an ID, which is a unique identifier specified by the buyer for the purchase order.

Figure 297Y:
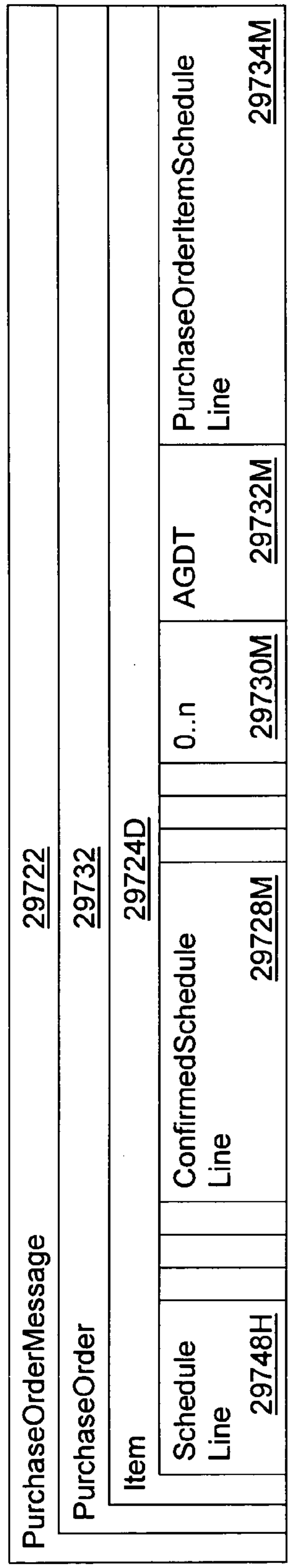

FIGS. 297A-Y depict the element structure for Purchase Order Interfaces. The element structure is similar to the data model, but provides additional information regarding the details of the interface. The element structure identifies the different packages 29700 in the interface, and represents the entities and/or attributes at various levels within the interface. As depicted in FIGS. 297A-Y, the interface for Purchase Order Interface includes seven levels 29702, 29704, 29706, 29708, 29710, 29712, and 29714. The element structure identifies the cardinality or occurrence 29716 between the entities and/or attributes of the interface, and provides information (i.e., type 29718 and name 29720) regarding the data type that provides the basis for the entity and/or attributes. The outermost package of this interface is an PurchaseOrderMessage package 29722, which includes PurchaserOrderMessages entity 29724 at the first level 29702. The PurchaserOrderMessages entity 29724 is of type message data type ("MDT") 29726 "Purchase Order Message" 29728.

The PurchaseOrderMessage package 29722 includes a MessageHeader package 29730 and a PurchaseOrder package 29732. The MessageHeader package 29730 includes MessageHeader entity 29734, which is of type AGDT 29738 BusinessDocumentMessageHeader 29740. There is one 29736 MessageHeader entity 29734 for each PurchaseOrderMessage entity 29724.

The MessageHeader entity 29734 includes a MessageID 29742, a ReferenceID 29750, and a CreationDateTime 29758. MessageID 29742 is of type GDT 29746 BusinessDocumentMessageID 29748. ReferenceID 29750 is of type GDT 29754 BusinessDocumentMessageID 29756. CreationDateTime 29758 is of type GDT 29762 DateTime 29764. There is one 29744 MessageID 29742 for each MessageHeader entity 29734, one or zero 29752 ReferenceID for each MessageHeader entity 29734, and one 29760 CreationDateTime 29758 for each MessageHeader entity 29734.

The MessageHeader entity 29734 also includes a SenderParty entity 29766 and a RecipientParty entity 29722A. The SenderParty entity 29766 is of type AGDT 29770 BusinessDocumentMessageHeaderParty 29772, and RecipientParty entity 29722A is of type AGDT 29726A BusinessDocumentMessageHeaderParty 29728A. There is one or zero 29768 SenderParty entity 29766 for each MessageHeader entity 29734. There is any number 29724A of RecipientParty entities 29722A for each MessageHeader entity 29734.

The SenderParty entity 29766 includes an InternalID 29774, a StandardID 29782, and a ContactPerson 29790. The InternalID 29774 is of type CDT 29778 PaymentInternalID 29780. StandardID 29782 is of type CDT 29786 PartyStandardID 29788. ContactPerson 29790 is of type CDT 29794 ContactPerson 29796. There is zero or one 29776 InternalID 29774 for each SenderParty entity 29766. There is any number 29784 of StandardID 29782 for each SenderParty entity 29766. There is zero or one 29792 ContactPerson 29790 for each SenderParty entity 29766.

The ContactPerson 29790 includes a BuyerID 29798, a SellerID 29706A, and an Address 29714A. The BuyerID 29798 is of type CDT 29702A ContactPersonPartyID 29704A. The SellerID 29706A is of type CDT 29710A ContactPersonPartyID 29712A. The Address 29714A is of type AGDT 29718A Address 29720A. There is respectively one or zero 29700A, 29708A, and 29716A BuyerID 29798, SellerID 29706A, and Address 29714A for each ContactPerson 29790.

The PurchaseOrder package 29732 includes a Party package 29710B, a Location package 29712B, a DeliveryInformation package 29714B, a PaymentInformation package 29716B, an Attachment package 29718B, a Description package 29720B, a FollowUpBusinessTransactionDocument package 29722B, and an Item package 29724B. The PurchaseOrder package 29732 also includes a PurchaseOrder entity 29730A. The PurchaseOrder entity 29730A is of type AGDT 29734A PurchaseOrder 29736A. There is one 29732A PurchaseOrder entity 29730A for each PurchaseOrderMessage entity 29724.

The PurchaseOrder entity 29730A includes an ID 29738A, a SellerID 29746A, a BuyerPostingDateTime 29754A, a BuyerLastChangeDateTime 29762A, a SellerPostingDateTime 29770A, a SellerLastChangeDateTime 29778A, an AcceptanceStatusCode 29786A, a Note 29794A, and an ItemListCompleteTransmissionIndicator 29702B. ID is of type GDT 29742A BusinessTransactionDocumentID 29744A. SellerID 29746A is of type GDT 29750A BusinessTransactionDocumentID 29752A. BuyerPostingDateTime 29754A is of type GDT 29758A DateTime 29760A. BuyerLastChangeDateTime 29762A is of type GDT 29766A DateTime 29768A. SellerPostingDateTime 29770A is of type GDT 29774A DateTime 29776A. SellerLastChangeDateTime 29778A is of type GDT 29782A DateTime 29784A. AcceptanceStatusCode 29786A is of type GDT 29790A AcceptanceStatusCode 29792A. Note 29794A is of type GDT 29798A Note 29700B. ItemListCompleteTransmissionIndicator 29702B is of type GDT 29706B CompleteTransmissionIndicator 29708B. There is one 29740A ID 29738A for each PurchaseOrder entity 29730A. There is respectively zero or one 29748A, 29756A, 29764A, 29772A, 29780A, 29788A, 29796A, and 29704B SellerID 29746A, BuyerPostingDateTime 29754A, BuyerLastChangeDateTime 29762A, SellerPostingDateTime 29770A, Seller- LastChangeDateTime 29778A, AcceptanceStatusCode 29786A, Note 29794A, and ItemListCompleteTransmission-Indicator 29702B for each PurchaseOrder entity 29730A.

The Party package 29710B includes a BuyerParty entity 29726B, a SellerParty entity 29714C, a ProductRecipient-Party entity 29724C, a VendorParty entity 29732C, a ManufacturerParty entity 29740C, a BillToParty entity 29748C, a PayerParty entity 29756C, and a CarrierParty entity 29764C.

The BuyerParty entity 29726B is of type AGDT 29730B BusinessTransactionDocumentParty 29732B. The SellerParty entity 29714C is of type AGDT 29720C BusinessTransactionDocumentParty 29722C. The ProductRecipientParty entity 29724C is of type AGDT 29728C BusinessTransactionDocumentParty 29730C. The VendorParty entity 29732C is of type AGDT 29736C BusinessTransactionDocument-Party 29738C. The ManufacturerParty entity 29740C is of type AGDT 29744C BusinessTransactionDocumentParty 29746C. The BillToParty entity 29748C is of type AGDT 29752C BusinessTransactionDocumentParty 29754C. The PayerParty entity 29756C is of type AGDT 29760C BusinessTransactionDocumentParty 29762C. The CarrierParty entity 29764C is of type AGDT 29768C BusinessTransactionDocumentParty 29770C. There is zero or one 29728B BuyerParty entity 29726B for each PurchaseOrder entity 29730A. There is zero or one 29716C SellerParty entity 29714C for each PurchaseOrder entity 29730A. There is zero or one 29726C ProductRecipientParty entity 29724C for each PurchaseOrder entity 29730A. There is zero or one 29734C VendorParty entity 29732C for each PurchaseOrder entity 29730A. There is zero or one 29742C ManufacturerParty entity 29740C for each PurchaseOrder entity 29730A. There is zero or one 29750C BillToParty entity 29748C for each PurchaseOrder entity 29730A. There is zero or one 29758C PayerParty entity 29756C for each PurchaseOrder entity 29730A. There is zero or one 29766C CarrierParty entity 29764C for each PurchaseOrder entity 29730A.

The BuyerParty entity 29726B includes a StandardID 29734B, a BuyerID 29742B, a SellerID 29750B, an Address 29758B, and a ContactPerson 29766B. The StandardID 29734B is of type CDT 29738B PartyStandardID 29740B. The BuyerID 29742B is of type CDT 29746B PartyPartyID 29748B. The SellerID 29750B is of type CDT 29754B PartyPartyID 29756B. The Address 29758B is of type AGDT 29762B Address 29764B. The ContactPerson 29766B is of type CDT 29770B ContactPerson 29772B. There are any number 29736B of StandardID 29734B for each BuyerParty 29726B. There is zero or one 29744B BuyerID 29742B for each BuyerParty 29726B. There is zero or one 29752B SellerID 29750B for each BuyerParty 29726B. There is zero or one 29760B Address 29758B for each BuyerParty 29726B. There is zero or one 29768B ContactPerson 29766B for each BuyerParty 29726B.

The ContactPerson 29766B includes a BuyerID 29790B, a SellerID 29798B, and an Address 29706C. The BuyerID is of type CDT 29794B ContactPersonPartyID 29796B. The SellerID 29798B is of type CDT 29702C ContactPersonPartyID 29704C. The Address 29706C is of type AGDT 29710C Address 29712C. There is zero or one 29792B BuyerID 29790B for each ContactPerson 29766B. There is zero or one 29700C SellerID 29798B for each ContactPerson 29766B. There is zero or one 29708C Address 29706C for each ContactPerson 29766B.

The Location package 29712B includes a ShipToLocation entity 29772C and a ShipFromLocation entity 29712D. The ShipToLocation entity 29772C is of type AGDT 29776C BusinessTransactionDocumentShipToLocation 29778C, and the ShipFromLocation entity 29712D is of type AGDT BusinessTransactionDocumentShipFromLocation 29718D. There is zero or one 29774C ShipToLocation entity 29772C for each PurchaseOrder entity 29730A, and zero or one 29714D ShipFromLocation entity 29712D for each PurchaseOrder entity 29730A.

The ShipToLocation entity 29772C includes a StandardID 29780C, a BuyerID 29788C, a SellerID 29796C, and an Address 29704D. There are any number 29782C of Standard ID 29780C for each ShipToLocation entity 29772C, zero or one 29790C BuyerID 29788C for each ShipToLocation entity 29772C, zero or one 29798C SellerID 29796C for each ShipToLocation entity 29772C, and zero or one 29706D Address 29704D for each ShipToLocation entity 29772C. The StandardID 29780C is of type CDT 29784C Location-StandardID 29786C. The BuyerID 29788C is of type CDT 29792C LocationPartyID 29794C. The SellerID 29796C is of type CDT 29700D LocationPartyID 29702D. The Address 29704D is of type AGDT 29708D Address 29710D.

The DeliveryInformation package 29714B includes a DeliveryTerms entity 29720D. The DeliveryTerms entity 29720D includes a DeliveryItemGroupID 29728D, a DeliveryPriorityCode 29736D, an Incoterms 29744D, a PartialDelivery 29760D, a QuantityTolerance 29780D, a Maximum-LeadTimeDuration 29712E, a Transport 29720E, and a Description 29748E. The DeliveryItemGroupID 29728D has an occurrence of zero or one 29730D for each DeliveryTerms entity 29720D, and is of type GDT 29732D BusinessTransactionDocumentItemGroupID 29734D. The DeliveryPriorityCode 29736D has an occurrence of zero or one 29738D for each DeliveryTerms entity 29720D, and is of type GDT 29740D BusinessTransactionPriorityCode 29742D. The Incoterms 29744D has an occurrence of zero or one 29746D for each DeliveryTerms entity 29720D, and is of type GDT 29748D Incoterms 29750D. The PartialDelivery 29760D has an occurrence of zero or one 29762D for each DeliveryTerms entity 29720D, and is of type AGDT 29764D PartialDelivery 29766D. The QualityTolerance 29780D has an occurrence of zero or one 29782D for each DeliveryTerms entity 29720D, and is of type AGDT 29784D QuantityTolerance 29786D. The MaximumLeadTimeDuration 29712E has an occurrence or zero or one 29714E for each DeliveryTerms entity 29720D, and is of type GDT 29716E Duration 29718E. The Transport 29720E has an occurrence of zero or one 29722E for each DeliveryTerms entity 29720D. The Description 29748E has an occurrence of zero or one 29750E for each DeliveryTerms entity 29720D, and is of type GDT 29752E Description 29754E.

The Incoterms entity 29744D includes a Classification-Code 29752D and a TransferLocationName 29756D. There is one 29754D ClassificationCode 29752D for each Incoterm 29744D, and zero or one 29758D TransferLocationName 29756D for each Incoterm 29744D.

The PartialDelivery 29760D includes a MaximalNumber 29768D and an UnlimitedIndicator 29772D. There is zero or one 29770D MaximalNumber 29768D for each PartialDelivery 29760D, and zero or one 29774D UnlimitedIndicator 29772D for each PartialDelivery 29760D. The Unlimited-Indicator 29772D is of type GDT 29776D UnlimitedIndicator 29778D.

The QualityTolerance 29780D includes an OverPercent 29788D, an OverPercentUnlimitedIndicator 29796D, and an UnderPercent 29704E. The OverPercent 29788D is of type GDT 29792D Percent 29794D, the OverPercentUnlimited-Indicator 29796D is of type GDT 29700E UnlimitedIndicator 29702E, and the UnderPercent 29704E is of type GDT 29708E Percent 29710E. There is zero or one 29790D Overpercent 29788D for each QualityTolerance 29780D, zero or one 29798D OverPercentUnlimitedIndicator 29796D for each QualityTolerance 29780D, and zero or one 29706E UnderPercent 29704E for each QualityTolerance 29780D.

The Transport 29772E includes a ServiceLevelCode 29724E, a ModeCode 29732E, and a MeansDescriptionCode 29740E. The ServiceLevelCode 29724E has an occurrence of zero or one 29726E for each Transport 29720E, and is of type GDT 29728E TransportServiceLevelCode 29730E. The ModeCode 29732E has an occurrence of zero or one 29734E for each Transport 29720E, and is of type GDT 29736E TransportModeCode 29738E. The MeansDescriptionCode 29740E has an occurrence of zero or one 29742E for each Transport 29720E, and is of type GDT 29744E Transport-MeansDescriptionCode 29746E.

The Description 29748E includes a LanguageCode 29756E. There is one 29758E LanguageCode 29756E for each Description 29748E.

The DeliveryInformation package 29714B also includes a CashDiscountTerms 29758E. The CashDiscountTerms 29758E is of type AGDT 29762E CashDiscountTerms 29764E. There is zero or one 29760E CashDiscountTerms 29758E for each PurchaseOrder 29730A.

The CashDiscountTerms 29758E includes a Payment-BaseLineDate 29766E, a MaximumCashDiscount 29774E, a NormalCashDiscount 29790E, and a FullPaymentDue-DaysValue 29710F. The PaymentBaseLineDate 29766E is of type GDT 29770E Date 29772E. There is zero or one 29768E PaymentBaseLineDate 29766E for each CashDiscountTerms 29758E. The MaximumCashDiscount 29774E is of type GDT 29778E CashDiscount 29780E. There is zero or one 29776E MaximumCashDiscount 29774E for each CashDiscountTerms 29758E. The NormalCashDiscount 29790E is of type GDT 29794E CashDiscount 29796E. There is zero or one 29792E NormalCashDiscount 29790E for each CashDiscountTerms 29758E. There is zero or one 29712F FullPaymentDueDaysValue 29710F for each CashDiscountTerms 29758E.

The MaximumCashDiscount 29774E includes a DaysValue 29782E and a Percent 29784E. There is one 29783E DaysValue 29782E for each MaximumCashDiscount 29774E, and one 29785E Percent 29784E for each MaximumCashDiscount 29774E. Percent 29784E is of type GDT 29786E Percent 29788E.

The NormalCashDiscount 29790E includes a DaysValue 29798E and a Percent 29702F. There is one 29700F DaysValue 29798E for each NormalCashDiscount 29790E, and one 29704F Percent 29702F for each NormalCashDiscount 29790E. Percent 29702F is of type GDT 29706F Percent 29708F.

The PaymentInformation package 29716B includes a PaymentForm entity 29714F. There is one or zero 29716F PaymentForm entity 29714F for each PurchaseOrder entity 29730A.

The PaymentForm entity 29714F includes a Code 29718F and a PaymentCard 29726F. There is one occurrence 29720F of Code 29718F for each PaymentForn entity 29714F, and there is zero or one occurrence 29728F of PaymentCard 29726F for each PaymentForm entity 29714F. The Code 29718F is of type GDT 29722F PaymentFormCode 29724F. The PaymentCard 29726F is of type AGDT 29730F PaymentCard 29732F.

The PaymentCard 29732F includes an ID 29734F, a ReferenceID 29742F, a SequenceID 29746F, a Holder 29750F, and an ExpirationDate 29754F. There is one 29736F ID 29734F for each PaymentCard 29726F, zero or one 29744F ReferenceID 29742F for each PaymentCard 29726F, zero or one 29748F SequenceID 29746F for each PaymentCard 29726F, zero or one 29752F Holder 29750F for each PaymentCard 29726F, and one 29756F ExpirationDate 29754F for each PaymentCard 29726F. The ID is of type GDT 29738F PaymentCardID 29740F. The ExpirationDate 29754F is of type GDT 29758F Date 29760F.

The Attachment package 29718B includes an Attachment entity 29762F, of type GDT 29766F Attachment 29768F. There are any number 29764F of Attachment entities 29762F for each PurchaseOrder entity 29730A.

The Attachment entity 29762F includes an ID 29770F and a Filename 29774F. There is one 29772F ID 29770F for each Attachment entity 29762F, and zero or one 29776F Filename 29774F for each Attachment entity 29762F.

The Description package 29720B includes a Description entity 29778F and a ConfirmationDescription entity 29790F. There is zero or one occurrence 29780F of the Description entity 29778F for each PurchaseOrder entity 29730A, and zero or one 29792F ConfirmationDescription entity 29790F for each Attachment entity 29762F. The Description 29778F is of type GDT 29782F Description 29784F. The ConfirmationDescription 29790F is of type GDT 29794F Description 29796F. The Description 29778F includes a LanguageCode 29786F, and there is one LanguageCode 29786F for each Description 29778F. Similarly, the ConfirmationDescription 29790F includes a LanguageCode 29798F, and there is one LanguageCode 29798F for each ConfirmationDescription 29790F.

The FollowUpBusinessTransactionDocument 29722B includes a FollowUpPurchaseOrderConfirmation 29702G, a FollowUpDespatchedDeliveryNotification 29714G, a FollowUpServiceAcknowledgementRequest 29726G, and a FollowUpInvoiceRequest 29742G. There is zero or one 29704G FollowUpPurchaseOrderConfirmation 29702G for each PurchaseOrder 29730A. There is zero or one 29716G FollowUpDespatchedDeliveryNotification 29714G for each PurchaseOrder 29730A. There is zero or one 29728G FollowUpServiceAcknowledgementRequest 29726G for each PurchaseOrder 29730A. There is zero or one 29744G FollowUpInvoiceRequest 29742G for each PurchaseOrder 29730A.

The FollowUpPurchaseOrderConfirmation 29702G includes a RequirementCode 29706G, which is of type GDT 29710G FollowUpMessageRequirementCode 29712G. There is one RequirementCode 29706G for each FollowUpPurchaseOrderConfirmation 29702G.

The FollowUpDespatchedDeliveryNotification 29714G includes a RequirementCode 29718G, which is of type GDT 29722G FollowUpMessageRequirementCode 29724G. There is one 29720G RequirementCode 29718G for each FollowUpDespatchedDeliveryNotification 29714G.

The FollowUpServiceAcknowledgementRequest 29726G includes a RequirementCode 29734G, which is of type GDT 29738G FollowUpMessageRequirementCode 29740G. There is one 29736G RequirementCode 29734G for each FollowUpServiceAcknowledgementRequest 29726G.

The FollowUpInvoiceRequest 29742G includes a RequirementCode 29746G, which is of type GDT 29750G FollowUpMessageRequirementCode 29752G. There is one 29748G RequirementCode 29746G for each FollowUpInvoiceRequest 29742G. The FollowUpInvoiceRequest 29742G also includes an EvaluatedReceiptSettlementIndicator 29754G, which is of type GDT 29758G EvaluatedReceiptSettlementIndicator 29760G. There is zero or one 29756G EvaluatedReceiptSettlementIndicator 29754G for each FollowUpInvoiceRequest 29742G.

The Item package 29724B includes an Item entity 29762G, which is of type AGDT 29766G PurchaseOrderItem 29768H.

There are any number 29764G of Item entities 29762 for each PurchaseOrder entity 30A. The Item entity 29762G includes an ID 29770G, a SellerID 29778G, an ActionCode 29778G, an AcceptanceStatusCode 29794G, an UnplannedItemPermissionCode 29702H, and a HierarchyRelationship 29710H. ID 29770G has an occurrence of zero or one 29772G for each Item entity 29762G, and is of type GDT 29774G BusinessTransactionDocumentItemID 29776G. SellerID 29778G has an occurrence of zero or one 29780G for each Item entity 29762G, and is of type GDT 29782G BusinessTransactionDocumentItemID 29784G. ActionCode 29786G has an occurrence of one 29788G for each Item entity 29762G, and is of type GDT 29790G ActionCode 29792G. AcceptanceStatusCode 29794G has an occurrence of zero or one 29796G for each Item entity 29762G, and is of type GDT 29798G AcceptanceStatusCode 29700H. UnplannedItemPermissionCode 29702H has an occurrence of zero or one 29704H for each Item entity 29762G, and is of type GDT 29706H UnplannedItemPermissionCode 29708H. HierarchyRelationship 29710H has an occurrence of zero or one 29712H.

The HierarchyRelationship 29710H includes a ParentItemID 29714H, a ParentItemSellerID 29722H, and a TypeCode 29730H. There is zero or one 29716H ParentItemID 29714H for each HierarchyRelationship 29710H. There is zero or one 29724H ParentItemSellerID 29722H for each HierarchyRelationship 29710H. There is one 29732H TypeCode 29730H for each HierarchyRelationship 29710H. ParentItemID 29714H is of type GDT 29718H BusinessTransactionDocumentItemID 29720H. ParentItemSellerID 29722H is of type GDT 29726H BusinessTransactionDocumentItemID 29728H. TypeCode 29730H is of type GDT 29734H BusinessTransactionDocumentItemHierarchyRelationshipTypeCode 29736H.

The Item package 29724B includes a ProductInformation package 29738H, a PriceInformation package 29739H, a Party package 29740H, a Location package 29741H, a DeliveryInformation package 29742H, a BusinessTransactionDocumentReference package 29743H, an Attachment package 29744H, a Description package 29746H, and a ScheduleLine package 29748H.

The ProductInformation package 29738H includes a Product entity 29750H and a ProductCategory entity 29790H. The Product entity 29750H is of type GDT 29754H BusinessTransactionDocumentProduct 29756H, and there is one or zero 29752 Product entity 29750H for each Item entity 29762G. The ProductCategory entity 29790H is of type GDT 29794H BusinessTransactionDocumentProductCategory 29796H, and there is one or zero 29792H ProductCategory entity 29790H for each Item entity 29762G.

The Product entity 29750H includes a StandardID 29754H, a BuyerID 29758H, a SellerID 29762H, a ManufacturerID 29766H, a TypeCode 29774H, and a Note 29782H. The StandardID 29754 is of type CDT 29756H ProductStandardID 29757H. The BuyerID 29758H is of type CDT 29760H ProductPartyID 29761H. The SellerID 29762H is of type CDT 29764H ProductPartyID 29765H. The ManufacturerID 29766H is of type CDT 29770H ProductPartyID 29772H. The TypeCode 29774H is of type GDT 29778H ProductTypeCode 29780H. The Note 29782H is of type GDT 29786H Note 29788H. There are any number 29755H of StandardID 29754H for each Product entity 29750H. There is zero or one 29759H BuyerID 29758H for each Product entity 29750H. There is zero or one 29763H SellerID 29762H for each Product entity 29750H. There is zero or one 29768H ManufacturerID 29766H for each Product entity 29750H. There is zero or one 29776H TypeCode 29774H for each Product entity 29750H. There is zero or one 29784H Note 29782H for each Product entity 29750H.

The ProductCategory entity 29790H includes a StandardID 29798H, a BuyerID 29706I, and a SellerID 29714I. There is any number of StandardID 29798H for each ProductCategory entity 29790H. There is zero or one 29708I BuyerID 29706I for each ProductCategory entity 29790H. There is zero or one 29716I SellerID 29714I for each ProductCategory entity 29790H. The StandardID is of type CDT 29702I ProductCategoryStandardID 29704I. The BuyerID 29706I is of type CDT 29710I ProductCategoryPartyID 297121. The SellerID 29714I is of type CDT 29718I ProductCategoryPartyID 29710I.

The PriceInformation package 29739H includes a Price entity 29722I. There is zero or one 29728I Price entity 29722I for each Item entity 29762G.

The Price entity 29722I includes a NetUnitPrice 29726I. There is zero or one 29728I NetUnitPrice 29726I for each Price entity 29722I. The NetUnitPrice 29726I is of type AGDT 29730I Price 297321.

The NetUnitPrice 29726I includes an Amount 29734I and a BaseQuantity 29744I. There is one 29736I Amount 29734I for each NetUnitPrice 29726I, and one 29746I BaseQuantity 29744I for each NetUnitPrice 29726I. Amount 29734I is of type GDT 29738I Amount 29740I, and BaseQuantity 29744I is of type GDT 29748I Quantity 29750I. Amount 29734I includes a CurrencyCode 29742I, and there is one CurrencyCode 29742I for each Amount 29734I. BaseQuantity 29744I includes a UnitCode 29752I, and there is one UnitCode 29752I for each BaseQuantity 29744I.

The PriceInformation package 29739H also includes a ConfirmedPrice entity 29756I. There is zero or one 29758I ConfirmedPrice 29756I for each Item entity 29762G. The ConfirmedPrice entity 29756I includes a NetUnitPrice 29760I, which is of type AGDT 29764I Price 297766I. There is zero or one 29762I NetUnitPrice 29760I for each ConfirmedPrice entity 29756I.

The NetUnitPrice 29760I includes an Amount 29768I and a BaseQuality 297821. The Amount is of type GDT 29772I Amount &74I, and there is one 29770I Amount &68I for each NetUnitPrice 29760I. The BaseQuality 29782I is of type GDT 29786I Quantity 29788I, and there is one 29784I BaseQuality 29782I for each NetUnitPrice 29760I. The Amount 29768 includes a CurrencyCode 29776I, and there is one 29778I CurrencyCode 29776I for each Amount 29768I. The BaseQuality 29782I includes a UnitCode 29790I, and there is one 29792I UnitCode 29790I for each BaseQuality 297821.

The Party package 29740H includes a BuyerParty entity 29794I, a SellerParty entity 29702J, a ProductRecipientParty entity 29710J, a VendorParty entity 29718J, a ManufacturerParty entity 29726J, a BillToParty entity 29734J, a PayerParty entity 29742J, and a CarrierParty entity 29750J. The BuyerParty entity 29794I has an occurrence of zero or one 29796I for each Item entity 29762G, and is of type AGDT 29798I BusinessTransactionDocumentParty 29700J. The SellerParty entity 29702J has an occurrence of zero or one 29704J for each Item entity 29762G, and is of type AGDT 29706J BusinessTransactionDocumentParty 29708J. The ProductRecipientParty entity 29710J has an occurrence of zero or one 29712J for each Item entity 29762G, and is of type AGDT 29714J BusinessTransactionDocumentParty 29716J. The VendorParty entity 29718J has an occurrence of zero or one 29720J for each Item entity 29762G, and is of type AGDT 29722J BusinessTransactionDocumentParty 29724J. The ManufacturerParty entity 29726J has an occurrence of zero or one 29728J for each Item entity 29762G, and is of type AGDT 29730J BusinessTransactionDocumentParty 29732J. The BillToParty entity 29734J has an occurrence of zero or one 29736J for each Item entity 29762G, and is of type AGDT 29738J BusinessTransactionDocumentParty 29740J. The PayerParty entity 29742J has an occurrence of zero or one 29744J for each Item entity 29762G, and is of type AGDT 29746J BusinessTransactionDocumentParty 29748J. The CarrierParty entity 29750J has an occurrence of zero or one 29752J for each Item entity 29762G, and is of type AGDT 29754J BusinessTransactionDocumentParty 29756J.

The Location package 29741H includes a ShipToLocation 29758H and a ShipFromLocation 29766J. The ShipToLocation 29758J is of type AGDT 29762J BusinessTransactionDocumentShipToLocation 29764J, and there is zero or one 29760J ShipToLocation 29764J for each Item entity 29762G. The ShipFromLocation 29766J is of type AGDT 29770J BusinessTransactionDocumentShipFromLocation 29772J, and there is zero or one 29768H ShipFromLocation 29766J for each Item entity 29762G.

The DeliveryInformation package 29742H includes DeliveryTerms 29774J. There is zero or one 29776J DeliveryTerms 29774J for each Item entity 29762G. The DeliveryTerms 29774J is of type AGDT 29778J DeliveryTerms 29780J.

The BusinessTransactionDocumentReference package 29743H includes a QuoteReference 29782J, a PurchaseContractReference 29706K, a SalesContractReference 29730K, an OriginPurchaseOrderReference 29754K, a BuyerProductCatalogueReference 29778K, and a SellerProductCatalogueReference 29702L. There is one or zero 29784J QuoteReference 29782J for each Item entity 29762G. There is any number of PurchaseContractReference 29706K for each Item entity 29762G. There is any number of SalesContractReference 29730K for each Item entity 29762G. There is zero or one 29756K OriginPurchaseOrderReference 29754K for each Item entity 29762G. There is zero or one 29780K BuyerProductCatalogueReference 29778K for each Item entity 29762G. There is zero or one 29704L SellerProductCatalogueReference 29702L for each Item entity 29762G:

QuoteReference 29782J is of type AGDT 29786J BusinessTransactionDocumentReference 29788J. QuoteReference 29782J includes an ID 29790J and an ItemID 29798J. There is one ID for each QuoteReference 29782J, and any number of ItemID 29798J for each QuoteReference 29782J. The ID is of type GDT 29794J BusinessTransactionDocumentID 29796J, and the ItemID 29798J is of type GDT 29702K BusinessTransactionDocumentItemID 29704K.

PurchaseContractReference 29706K is of type AGDT 29710K BusinessTransactionDocumentReference 29712K. PurchaseContractReference 29706K includes an ID 29714K, which is of type GDT 29718K BusinessTransactionDocumentID, and an ItemID 29722, which is of type BusinessTransactionDocumentItemID 29728K. There is one 29716K ID for each PurchaseContractReference 29706K, and any number of ItemID 29722K for each PurchaseContractReference 29706K.

SalesContractReference 29730K is of type AGDT 29734K BusinessTransactionDocumentReference 29736K. SalesContractReference 29730K includes an ID 29738K and an ItemID 29746K. There is one ID 29738K for each SalesContractReference 29730K, and any number of ItemID 29746K for each SalesContractReference 29730K. ID is of type GDT 29742K BusinessTransactionDocument ID 29744K, and ItemID 29746K is of type BusinessTransactionDocumentReference 29760K.

OriginPurchaseOrderReference 29754K is of type AGDT 29758K BusinessTransactionDocumentReference 29760K. OriginPurchaseOrderReference 29754K includes an ID 29762K, which is of type GDT BusinessTransactionDocumentID, and an ItemID 29770K, which is of type GDT 29774K BusinessTransactionDocumentItemID 29776K. There is one 29764K ID 29762K for each OriginPurchaseOrderReference 29754K, and any number 29772K of ItemID 29770K for each OriginPurchaseOrderReference 29754K.

BuyerProductCatalogueReference 29778K is of type AGDT 29782K CatalogueReference 29784K. BuyerProductCatalogueReference 29778K includes an ID 29786K and an ItemID 29794K. There is one 29788K ID 29786K for each BuyerProductCatalogueReference 29778K, and any number 29796K of ItemID 29794K for each BuyerProductCatalogueReference 29778K. ID is of type GDT 29790K CatalogueID 29792K, and ItemID 29794K is of type GDT 29798K CatalogueItemID 29700L.

SellerProductCatalogueReference 29702L is of type AGDT 29706L CatalogueReference 29708L. SellerProductCatalogueReference 29702L includes an ID 29710L and an ItemID 29718L. There is one 29712L ID 29710L for each SellerProductCatalogueReference 29702L, and any number 29720L of ItemID 29718L for each SellerProductCatalogueReference 29702L. ID is of type GDT 29714L CatalogueID 29716L, and ItemID 29718L is of type GDT 29722L CatalogueItemID 29724L.

The Attachment package 29744H includes an Attachment entity 29726L, which is of type AGDT 29732L Attachment 29734L. There is any number 29728L of Attachment entities 29726L for each Item entity 29762G.

The Description package 29746H includes a Description entity 29736L and a ConfirmationDescription entity 29748L. There is one or zero 29738L Description entity 29736L for each Item entity 29762G, and one or zero 29750L ConfirmationDescription entity 29748L for each Item entity 29762G. Description 29736L is of type GDT 29740L Description 29742L, and ConfirmationDescription 29748L is of type GDT 29752L Description 29754L. Description 29736L includes a LanguageCode 29744L, and there is one 29746L LanguageCode 29744L for each Description 29736L. ConfirmationDescription 29748L includes a LanguageCode 29756L, and there is one 29758L LanguageCode 29756L for each ConfirmationDescription 29748L.

The ScheduleLine package 29748H includes a ScheduleLine entity 29760L and a ConfirmedScheduleLine entity 29728M. There is any number 29762L of ScheduleLine entity 29760L for each Item entity 29762G, and any number 29730M of ConfirmedScheduleLine entity 29728M for each Item entity 29762G. ScheduleLine entity 29760L is of type AGDT 29764L PurchaseOrderItemScheduleLine 29766L, and ConfirmedScheduleLine entity 29728M is of type AGDT 29732M PurchaseOrderItemScheduleLine 29734M. ScheduleLine entity 29760L includes an ID 29768L, a SellerID 29776L, a DeliveryPeriod 29784L, and a Quantity 29716M. ID 29768L is of type GDT 29772L BusinessTransactionDocumentItemScheduleLineID 29774L. There is one or zero 29770L ID 29768L for each ScheduleLine 29760L. SellerID 29776L is of type GDT 29780L BusinessTransactionDocumentItemScheduleLineID 29782L. There is one or zero 29778L SellerID 29776L for each ScheduleLine 29760L. DeliveryPeriod 29784L is of type AGDT 29788L DateTimePeriod 29790L. There is one 29786L DeliveryPeriod 29784L for each ScheduleLine 29760L. Quantity 29716M is of type GDT 29720M Quantity 29722M. There is one or zeero 29718M Quantity 29716M for each ScheduleLine 29760L.

DeliveryPeriod 29784L includes a StartDateTime 29792L, an EndDateTime 29700M, and a Duration 29708M. StartDateTime 29792L is of type GDT 29796L DateTime 29798L, EndDateTime 29700M is of type GDT 29704M DateTime 29706M, and Duration 29708M is of type GDT 29712M Duration 29714M. There is a respective one or zero 29794L, 29702M, and 29710M StartDateTime 29792L, EndDateTime 29700M, and Duration 29708M for each DeliveryPeriod 29784L.

d) Service Acknowledgement Interfaces

In B2B processes, service acknowledgement interfaces are required for sending services entered by the seller so that they may be acknowledged by the buyer. Traditional methods of communication in an ordering process, such as mail or fax, are cost intensive, prone to error, and relatively slow, since data has to be entered manually. Electronic communication between the procurement and sales system largely eliminates such problems. Service acknowledgement interfaces directly integrate the applications that implement the interfaces and form a basis for mapping data to widely-used standard formats, such as PIDX. More than just a simple interface structure, the service acknowledgement interfaces define underlying corporate significance and, at the same time, dispense with the need to exchange proprietary information in straightforward purchasing processes. In this way, applications that implement the service acknowledgement interfaces may be integrated without the need for complex project work.

(1) Message Choreography

Figure 298:
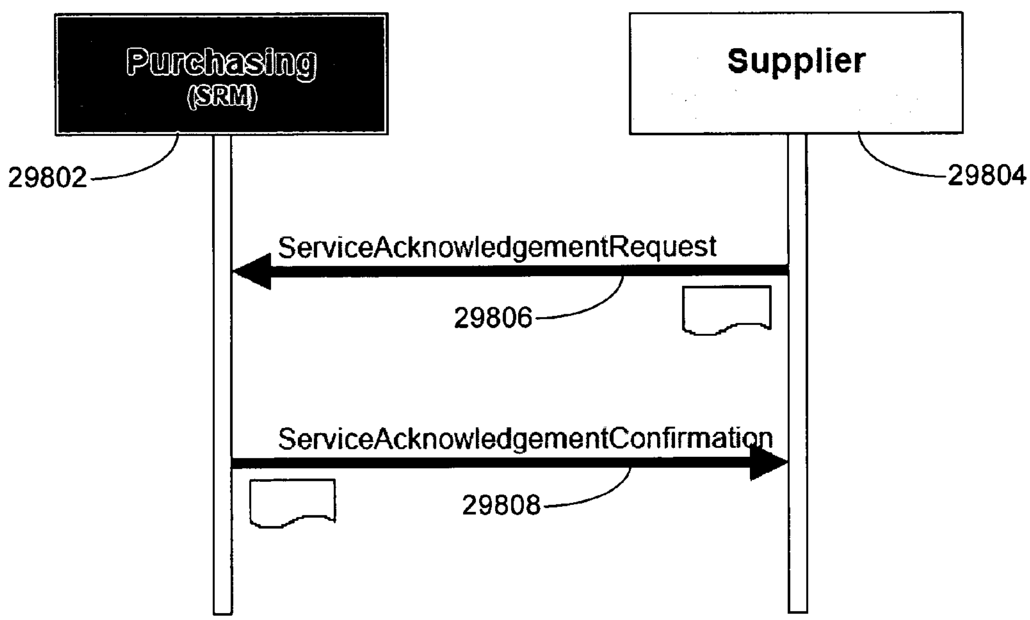
FIG. 298 depicts the message choreography for the Service Acknowledgement interfaces in accordance with methods and systems consistent with the present invention.
Figure 299A:
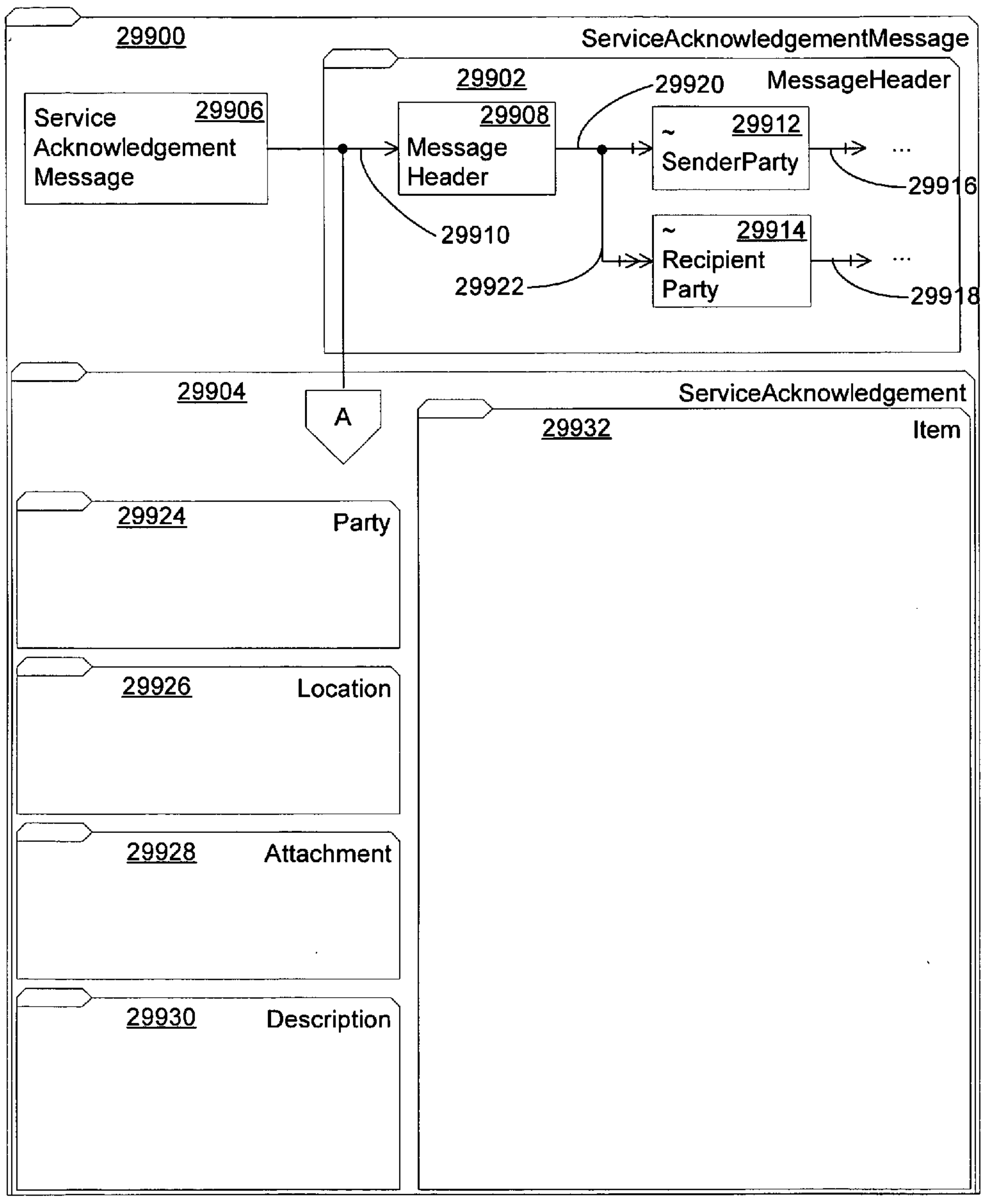
FIGS. 299A-J depict the data model for the Service Acknowledgement interfaces in accordance with methods and systems consistent with the present invention.
Figure 299B:
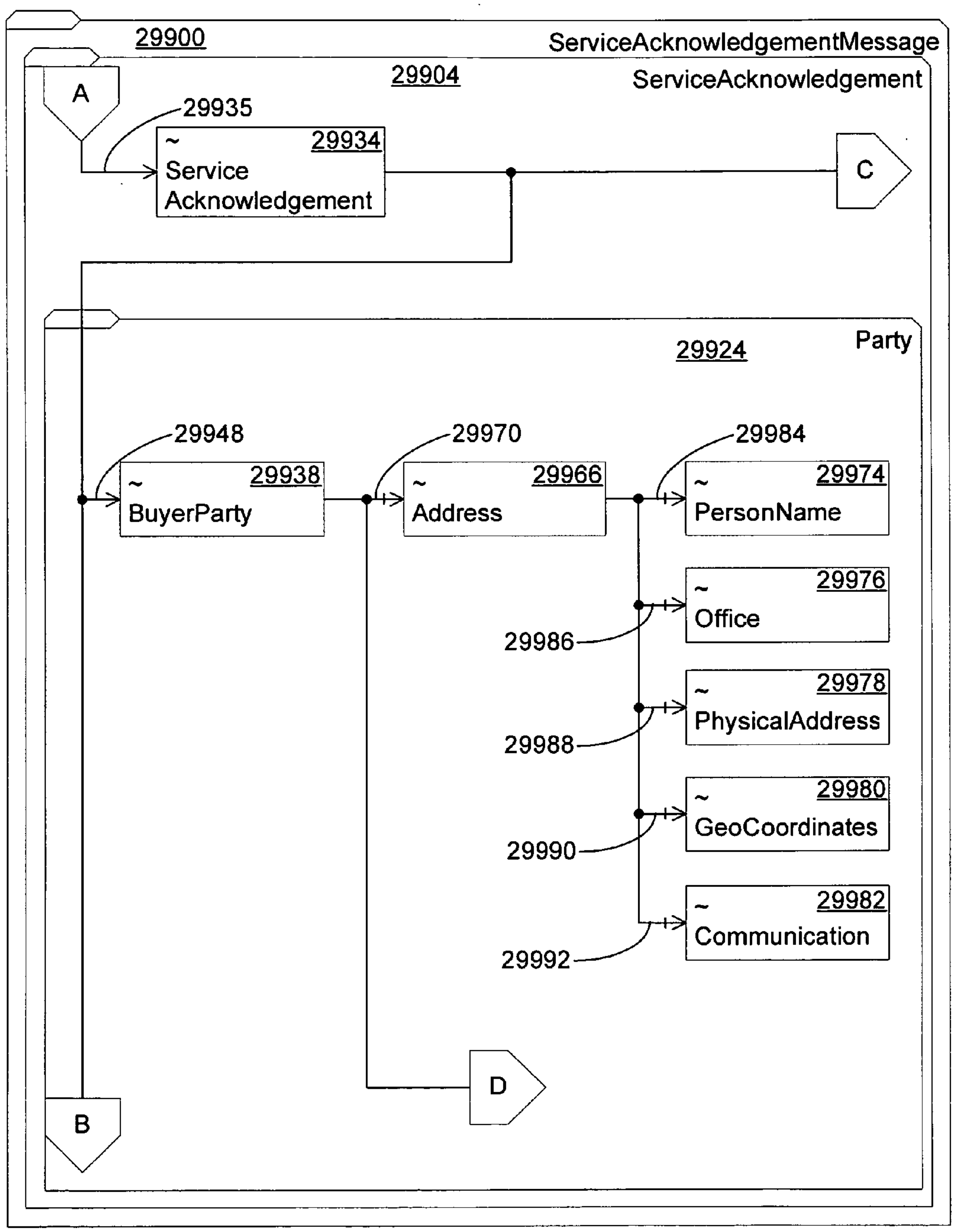
Figure 299C:
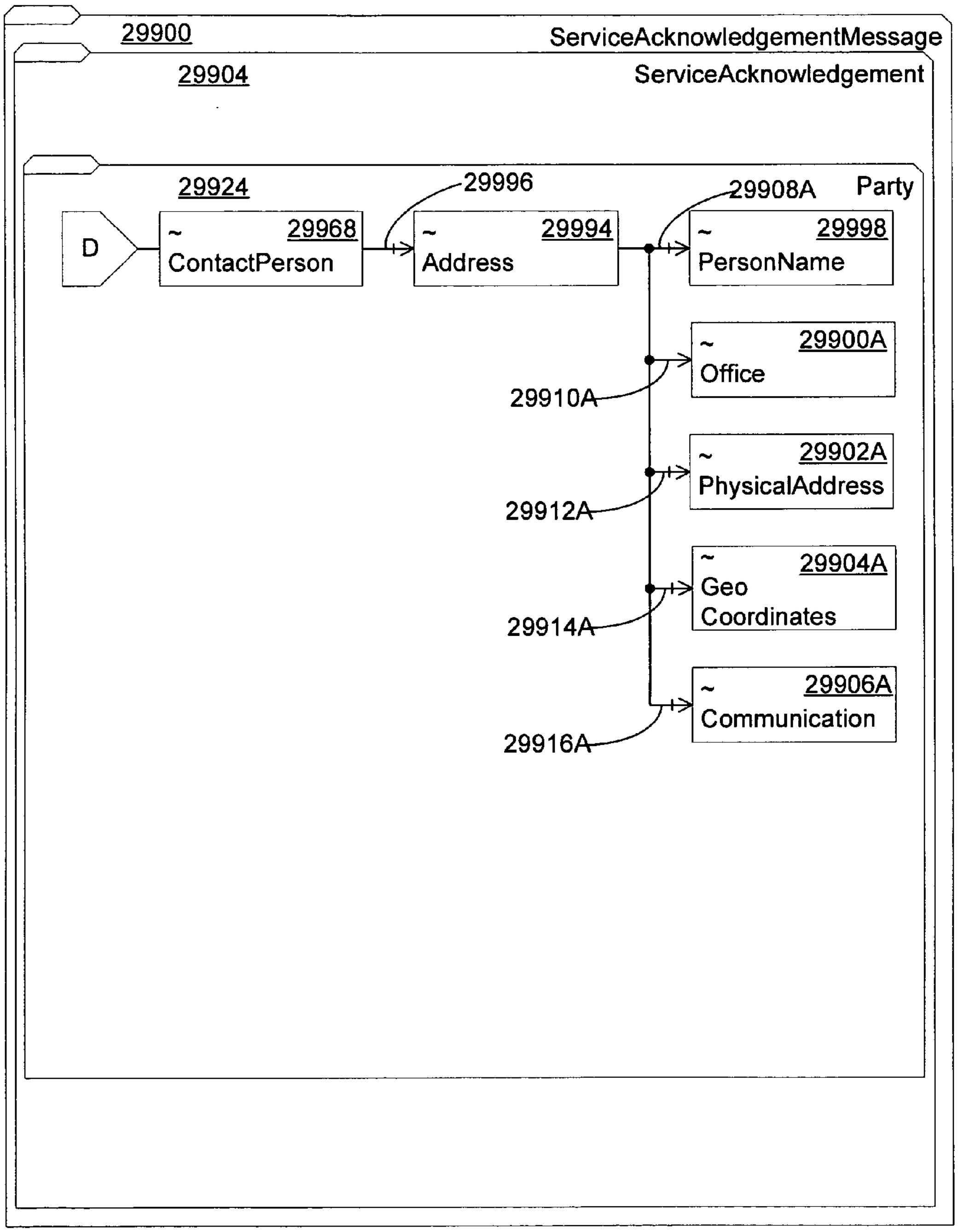
Figure 299D:
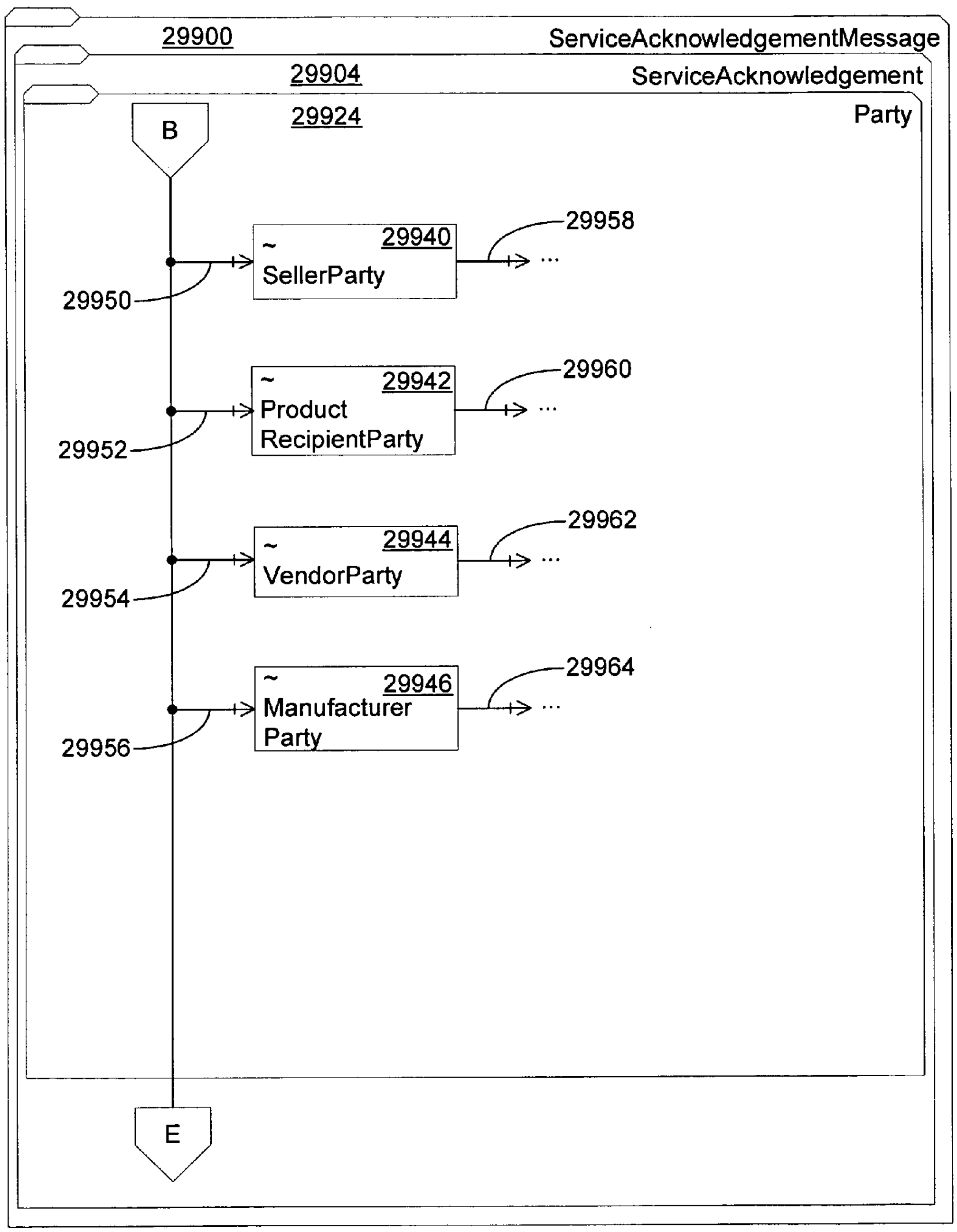
Figure 299E:
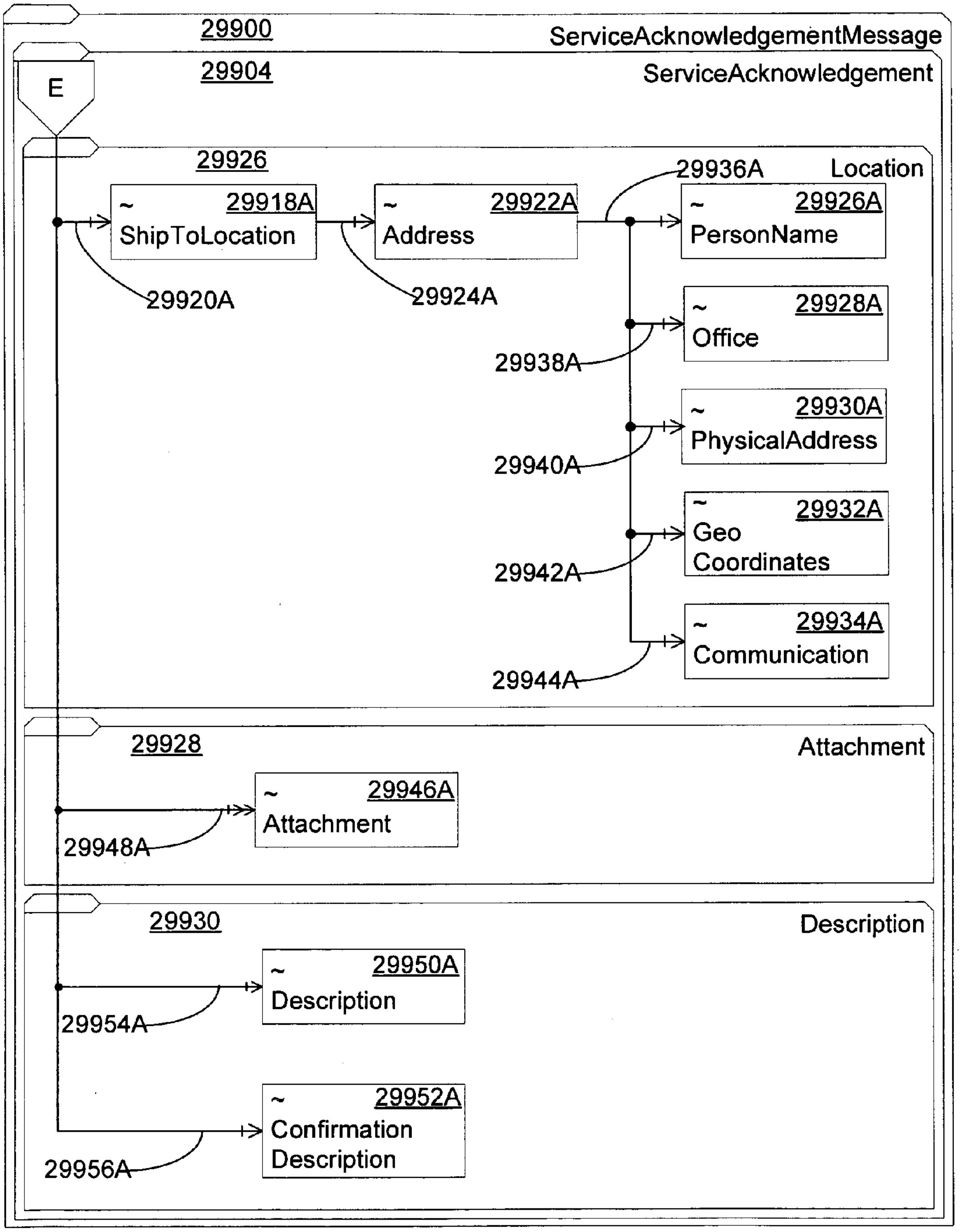
Figure 299F:
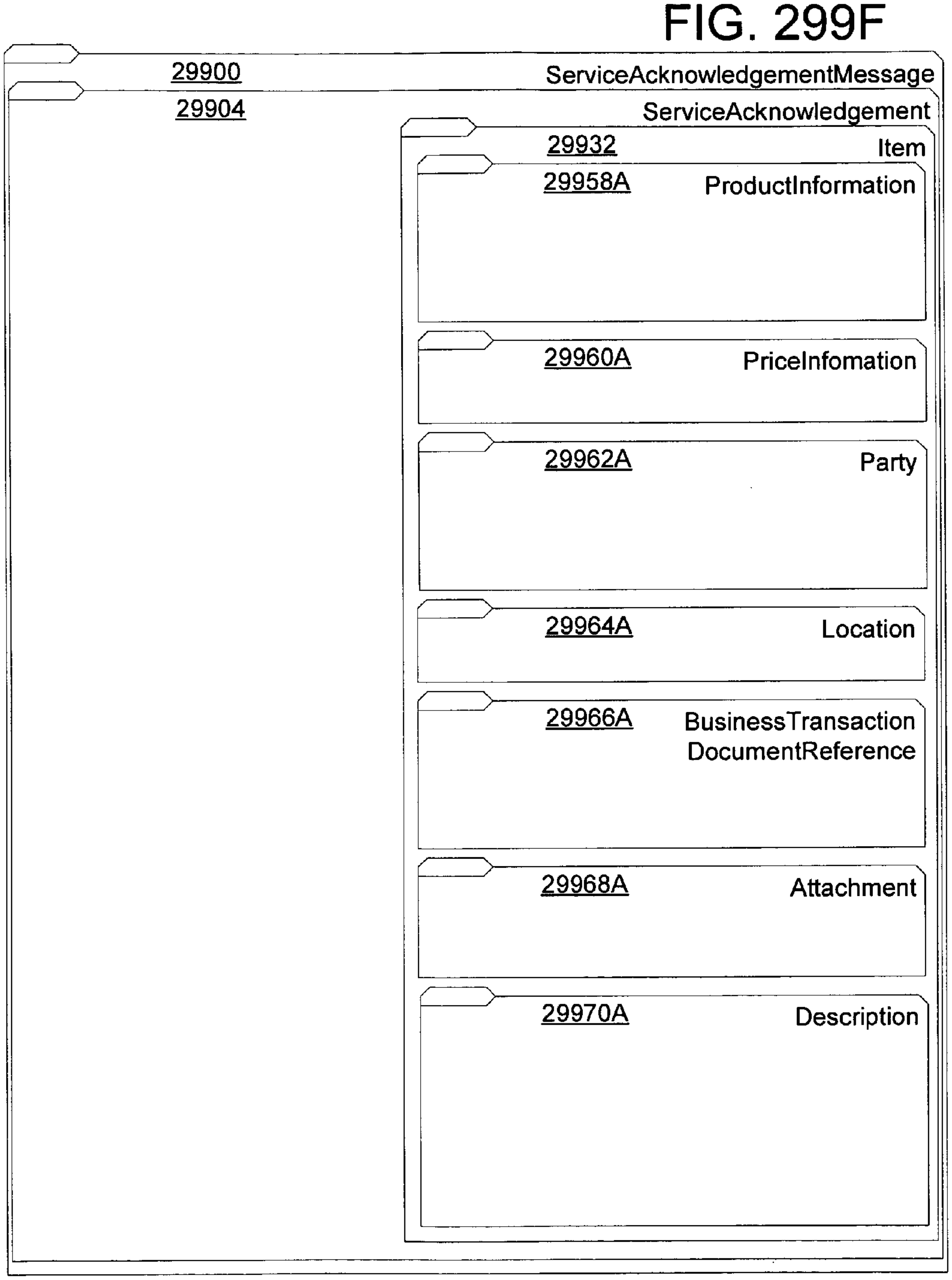
Figure 299G:
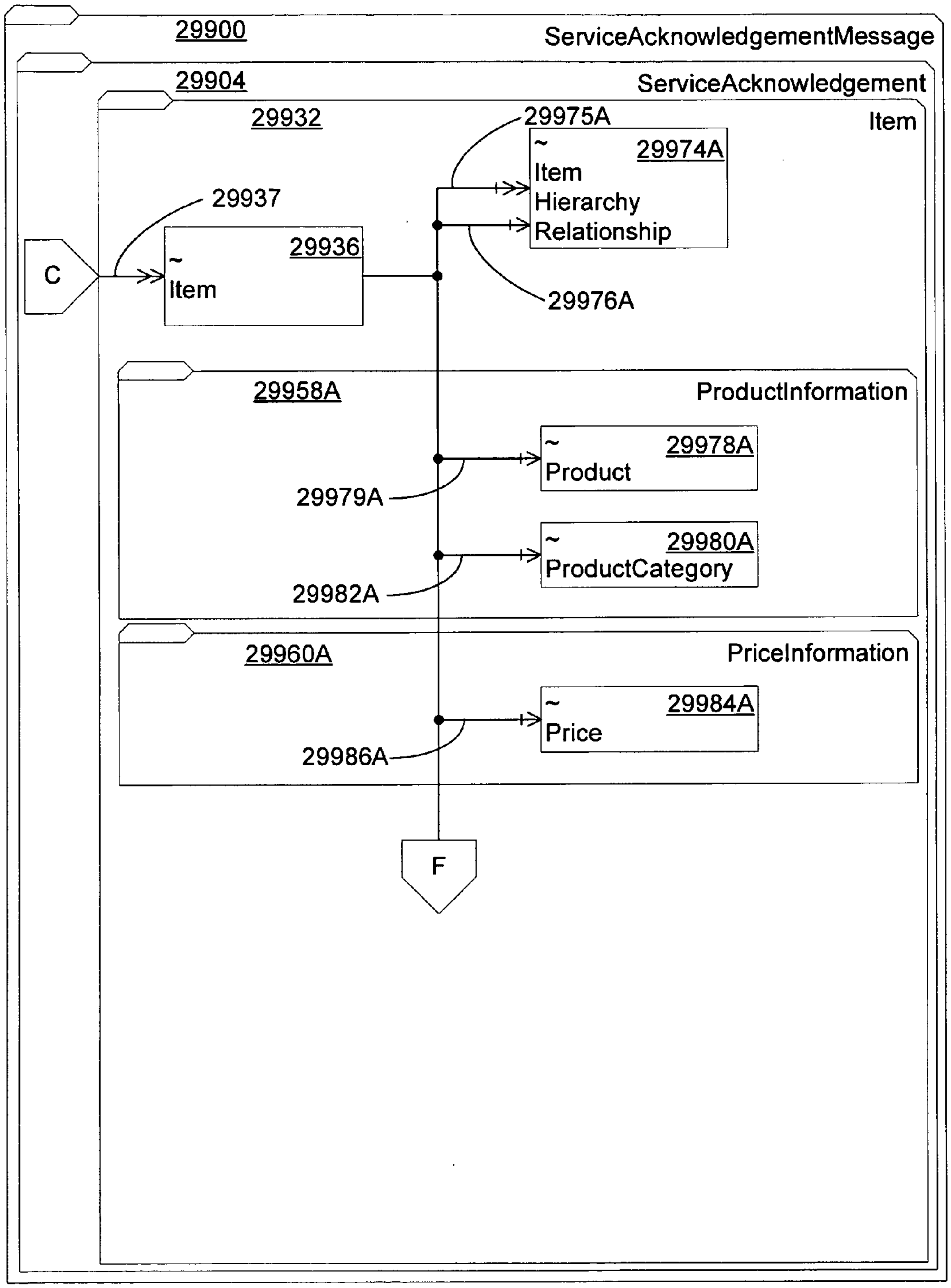
Figure 299H:
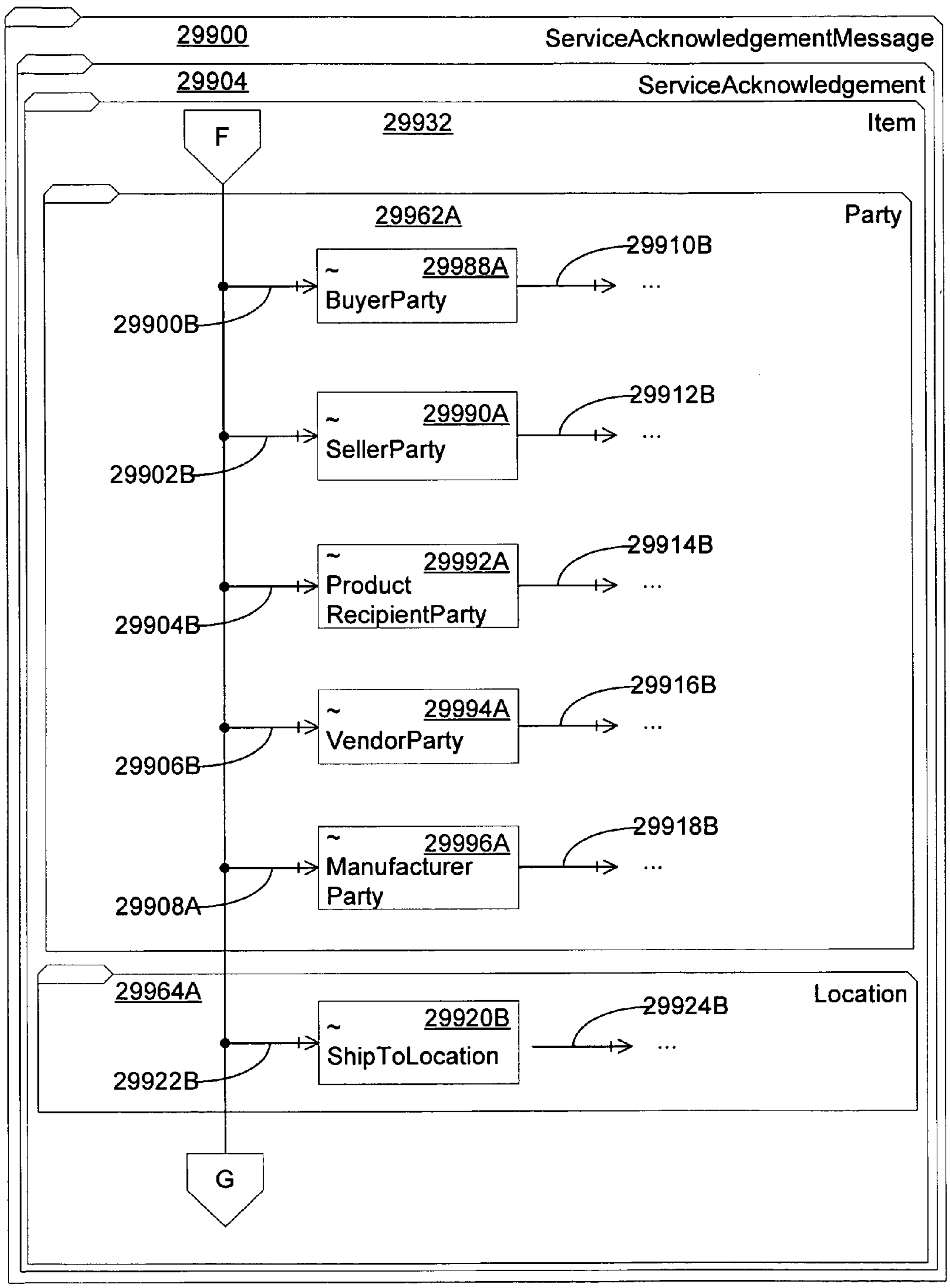
Figure 299I:
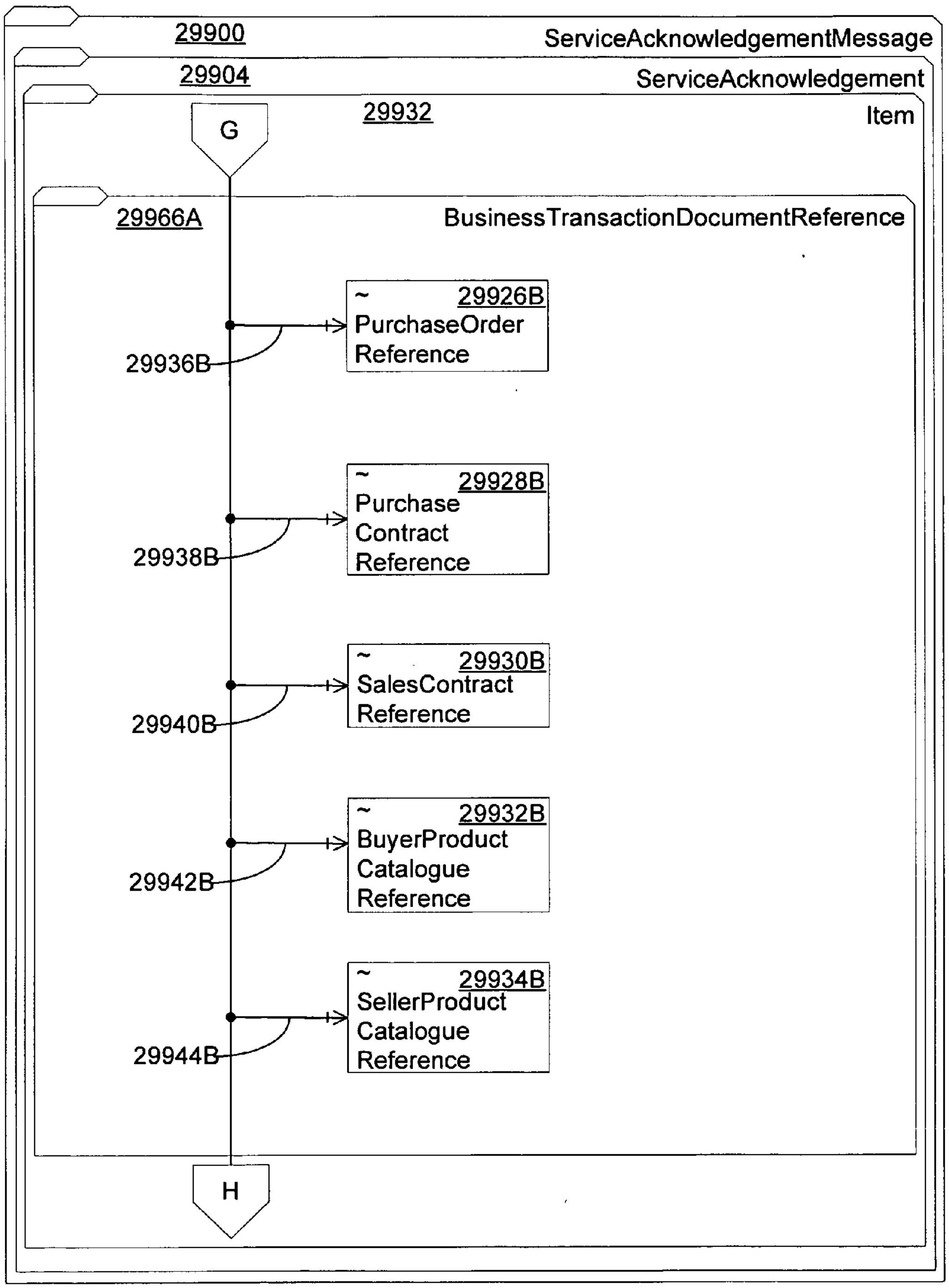
Figure 299J:
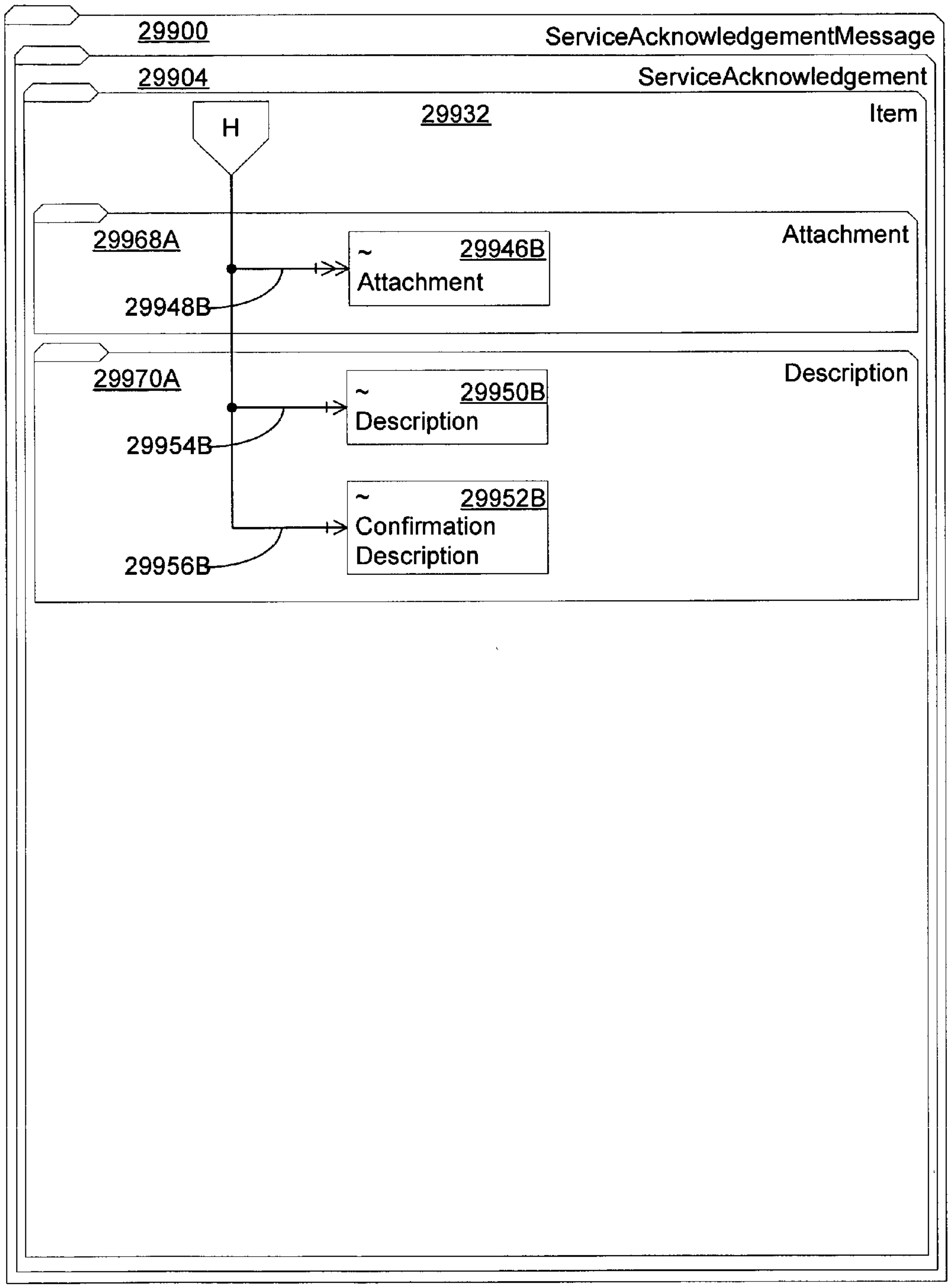

FIG. 298 depicts the message choreography for Service Acknowledgement Interfaces. The choreography involves two business entities: a seller or service provider (Purchasing or SRM) 29802 and a buyer (Supplier) 29804. In the implementation shown in FIG. 298, the seller 29802 sends a "ServiceAcknowledgementRequest" message 29806 to the buyer 29804. The ServiceAcknowledgementRequest message 29806 is used for sending one or more entered services. The buyer 29804 then sends a "ServiceAcknowledgementConfirmation" message 29808 to the seller 29802. The ServiceAcknowledgementConfirmation message 29808 is a direct response to a ServiceAcknowledgementRequest 29806 message and is used to acknowledge a service that has been entered.

Both the ServiceAcknowledgementRequest 29806 and the ServiceAcknowledgementConfirmation message 29808 use the same structure of message data type ServiceAcknowledgementMessage. As discussed below, however, each message 29806 and 29808 may use parts of the ServiceAcknowledgementMessage structure.

In one implementation, the ServiceAcknowledgementRequest 29806 is a request from the seller or Purchasing 29802 asking the buyer or Supplier 29804 to acknowledge one or more services that have been entered. The ServiceAcknowledgementRequest 29806 is used for ServiceAcknowledgement verification and for automatically settling a purchase order without the seller's ServiceAcknowledgement.

In one implementation, the ServiceAcknowledgementConfirmation 29808 is a confirmation (or rejection) of the service entered. The ServiceAcknowledgementConfirmation 29808 is the message used by the buyer or Supplier 29804 to inform the seller or Purchasing 29802 that the service acknowledgement is confirmed, pending decision, or rejected. The buyer 29804 may use the ServiceAcknowledgementConfirmation message 29808 as follows.

(1) The buyer 29804 may inform the seller 29802 of the confirmation status of the service. Possible statuses are "AP" (accepted), "AJ" (pending), and "RE" (rejected). The confirmation status may be set at header level only. Rejection at header level also signifies rejection of the items.

(2) The data in the ServiceAcknowledgementRequest 29806 is not changed. In addition to the confirmation status, a free text (ConfirmedDescription) may be entered at the header and item level as further explained below.

In one implementation, the ServiceAcknowledgementConfirmation 29808 is not required to be sent in response to the ServiceAcknowledgementRequest 29806 in the B2B service acknowledgement process.

In accordance with methods and systems consistent with the present invention, a service entry sheet is normally entered once an ordered service has been provided. The seller 29802 then sends a ServiceAcknowledgementRequest message 29806 requesting the buyer 29804 to acknowledge this service, which begins the service acknowledgement process. Once the ServiceAcknowledgementRequest message 29806 has been received by the buyer 29804, the buyer 29804 may use the ServiceAcknowledgementConfirmation message 29808 to accept or reject the service provided, or to assign it the temporary status "pending." The ServiceAcknowledgement Confirmation 29808 is not a negotiation tool (as is the case with order management), since the entire service may be accepted or rejected. The primary function of the ServiceAcknowledgement Confirmation message 29808 is to confirm that the service acknowledgement request has been sent correctly; providing information about required changes to the service acknowledgement is a secondary function. The ServiceAcknowledgementConfirmation 29808, therefore, includes the data received and checked by the buyer 29804. When a ServiceAcknowledgementRequest 29806 is rejected, however, the seller 29802 may be informed about change requests in free texts at header and item level in the ServiceAcknowledgementConfirmation message 29808. If the buyer 29804 rejects a service acknowledgement, the seller 29802 may send a new ServiceAcknowledgementRequest 29806. If the seller 29802 does not receive a response (e.g., another ServiceAcknowledgementConfirmation message 29808) from the buyer 29804, the service is considered to have been accepted.

(2) Message Data Type Service Acknowledgement Message

The data model for the message data type ServiceAcknowledgementMessage used to implement a ServiceAcknowledgementRequest message 29806 and a ServiceAcknowledgementConfirmation message 29808 is depicted in FIGS. 299A-J. The message data type ServiceAcknowledgementMessage includes a ServiceAcknowledgementMessage package 29900. The ServiceAcknowledgement Message package 29900 includes a MessageHeader package 29902, a ServiceAcknowledgement package 29904, and a ServiceAcknowledgementMessage object or entity 29906.

The following rules may be followed to ensure that the elements and entities in the ServiceAcknowledgementMessage package 29900 are used correctly with regard to their respective changeability in the acknowledgement process:

(1) In a ServiceAcknowledgementConfirmation message 29808 having the structure of the message data type ServiceAcknowledgementMessage, no data is changed by the buyer 29802 vis-à-vis the ServiceAcknowledgementRequest 29806. The service acknowledgement status and a description of the buyer are specified in the ServiceAcknowledgementConfirmation 29808 in addition to the ServiceAcknowledgementRequest 29806.

(a) Message Header Package

A MessageHeader package 29902 groups together the business information that is relevant for sending a business document in a message. The MessageHeader package 29902 includes a MessageHeader entity 29908. There is a 1:1 relationship 29910 between the ServiceAcknowledgementMessage entity 29906 and the MessageHeader entity 29908.

A MessageHeader entity 29908 groups together business information from the perspective of the sending application to identify the business document in a message, to provide information about the sender, and to provide any information about the recipient. The MessageHeader entity 29908 is of type GDT: BusinessDocumentMessageHeader. The MessageHeader entity 29908 includes an ID, a ReferencedID, and a CreationDateTime. The MessageHeader entity 29908 includes a SenderParty entity 29912 and a RecipientParty 29914. There is a 1:c relationship 29920 between the MessageHeader entity 29908 and the SenderParty entity 29912 and a 1:cn relationship 29922 between the MessageHeader entity 29908 and the RecipientParty entity 29914.

The SenderParty is the party responsible for sending a BusinessDocument at business application level. The SenderParty entity 29912 is of type GDT: BusinessDocumentMessageHeaderParty. The SenderParty entity 29912 may be filled by the sending application to name a contact person for any problems with the message. This is particularly useful if an additional infrastructure (such as a marketplace) is located between the SenderParty entity 29912 and the RecipientParty entity 29914.

The RecipientParty is the party responsible for receiving a business document at business application level. The RecipientParty entity 29914 is of type GDT: BusinessDocumentMessageHeaderParty. The RecipientParty entity 29914 may be filled by the sending application to name a contact person for any problems with the message. The SenderParty entity 29912 and the RecipientParty entity 29914 include additional information required by the parties 29916 and 29918 as discussed in detail below.

(b) Service Acknowledgement Package

The ServiceAcknowledgement package 29904 includes a Party package 29924, a Location package 29926, an Attachment package 29928, a Description package 29930, and an Item package 29932. The ServiceAcknowledgement package 29904 also includes a ServiceAcknowledgement entity 29934. There is a 1:1 relationship 29935 between the ServiceAcknowledgementMessage entity 29906 and the ServiceAcknowledgement entity 29934. The ServiceAcknowledgement is a request from the seller asking the buyer to acknowledge a service that has been entered (or the buyer's acknowledgement of the entered service).

In addition to the buyer and seller, other parties identified in the Party package 29924 may participate in the ServiceAcknowledgement. The ServiceAcknowledgement entity 29934 is of type GDT: ServiceAcknowledgement and includes an ID, a BuyerID, a CreationDateTime, a AcceptanceStatusCode, and a Note. The ID is a unique identifier assigned by the seller for the service acknowledgement and is of type GDT: BusinessTransactionDocumentID. The BuyerID is a unique identifier assigned by the buyer for the service acknowledgement and is of type GDT: BusinessTransactionDocumentID. The CreationDateTime is the time at which the seller created the service acknowledgement and is of type GDT: DateTime. The AcceptanceStatusCode is the coded representation for the status of the seller's agreement to the service acknowledgement and is of type GDT: AcceptanceStatusCode. The Note is a short description or the title of the service acknowledgement. It is generally used to provide the user with a simple method for searching for a particular service acknowledgement. The Note is of type GDT: Note.

(i) Service Acknowledgement Party Package

The Party package 29924 groups together the business parties involved in the service acknowledgement. The Party package 29924 includes a BuyerParty entity 29938, a SellerParty entity 29940, a ProductRecipientParty entity 29942, a VendorParty entity 29944, and a ManufacturerParty entity 29946. There is a 1:1 relationship 29948 between the ServiceAcknowledgement entity 29934 and the BuyerParty entity 29938. There is a 1:c relationship 29950 between the ServiceAcknowledgement entity 29934 and the SellerParty entity 29940. There is a 1:c relationship 29952 between the ServiceAcknowledgement entity 29934 and the ProductRecipientParty entity 29942. There is a 1:c relationship 29954 between the ServiceAcknowledgement entity 29934 and the VendorParty entity 29944. There is also a 1:c relationship 29956 between the ServiceAcknowledgement entity 29934 and the ManufacturerParty entity 29946. Each of the SellerParty entity 29940, the ProductRecipientParty entity 29942, the VendorParty entity 29944, and the ManufacturerParty entity 29946 includes the same elements as those described below for the BuyerParty entity 29938 as denoted by ellipses 29958, 29960, 29962, and 29964.

Either the ID or the ID and address may be transferred for each party 29938, 29940, 29942, 29944, and 29946. If the ID is transferred, the ID address defined in the master data is used. If the ID and address are transferred, the ID identifies the party and the address is deemed to be a document address that is different to the master data address. For the parties 29938, 29940, 29942, 29944, and 29946, a default logic applies for transferring data from the document header to the items and within item hierarchies. Parties specified in the header are used for the items for which a corresponding party is not explicitly transferred and that are directly assigned to the header. In accordance with the same logic, parties transferred at item level are used for the subitems assigned to the relevant item in an item hierarchy. The default logic applies for the party as a whole, including the contact person. Parts of a party specified at header level or for a hierarchy item cannot be specified in more detail at item level.

The BuyerParty is a party that buys goods or services. The BuyerParty entity 29938 is of type GDT: BusinessTransactionParty. The BuyerParty entity 29938 includes an Address entity 29966 and a ContactPerson entity 29968. There is a 1:1 relationship 29970 between the BuyerParty entity 29938 and the Address entity 29966. There is a 1:c relationship 29972 between the BuyerParty entity 29938 and the ContactPerson entity 29968.

The Address entity 29966 includes a PersonName entity 29974, an Office entity 29976, a PhysicalAddress entity 29978, a GeoCoordinates entity 29980, and a Communication entity 29982. There is a respective 1:c relationship 29984, 29986, 29988, 29990, and 29992 between the Address entity 29966 and the PersonName entity 29974, the Office entity 29976, the PhysicalAddress 29978, the GeoCoordinates entity 29980, and the Communication entity 29982.

The ContactPerson entity 29968 includes an Address entity 29994. There is a 1:c relationship 29996 between the ContactPerson entity 29968 and the Address entity 29994. Similar to the Address entity in the BuyerParty 29938 discussed above, the Address entity 29994 includes a PersonName entity 29998, an Office entity 29900A, a PhysicalAddress 29902A, a GeoCoordinates entity 29904A, and a Communication entity 29906A. There is a respective 1:c relationship 29908A, 29910A, 29912A, 29914A, and 29916A between the Address entity 29994 and the PersonName entity 29998, the Office entity 29900A, the PhysicalAddress 29902A, the GeoCoordinates entity 29904A, and the Communication entity 29906A.

The same BuyerParty entity 29938 may be used for the ServiceAcknowledgement items. In one implementation, the Contact for BuyerParty entity 29938 is permitted to change from item to item and different addresses in each item are not permitted.

The SellerParty is the party that sells goods or services. The SellerParty entity 29940 is of type GDT: BusinessTransactionParty. In one implementation, the same SellerParty entity 29940 is used for the service acknowledgement items. A different SellerParty entity 29940 may be used in each item. If a VendorParty entity 29944 is not explicitly specified in an ordering process, the SellerParty entity 29940 may also be used as the VendorParty entity 29944.

The ProductRecipientParty is a party to which goods are delivered or for whom services are provided. The ProductRecipientParty entity 29942 is of type GDT: BusinessTransactionDocumentParty. If a ShipToLocation is not explicitly specified in a service acknowledgement process, the ProductRecipientParty entity 29942 address is used as the ship-to address. The ProductRecipientParty is not synonymous with the ShipToLocation and in one implementation is to be used when the ProductRecipientParty (company or person) is actually different from the BuyerParty entity 29938.

The VendorParty is a party that delivers goods or provides services. The VendorParty entity 29944 is of type GDT: BusinessTransactionDocumentParty.

The ManufacturerParty is a party that manufactures goods. The ManufacturerParty entity 29946 is of type GDT: BusinessTransactionDocumentParty. The ManufacturerParty entity 29946 may be used for Material items. The ManufacturerParty entity 29946 may be used for uniquely defining the context of a ManufacturerProductID. Since material items may also appear in this message, they may also be specified in the message (although the messages are within the service process).

(ii) Service Acknowledgement Location Package

The Location package 29926 groups together the locations relevant for the service acknowledgement. The Location package 29926 includes a ShipToLocation entity 29918A. There is a 1:c relationship 29920A between the ServiceAcknowledgement entity 29934 and the ShipToLocation entity 29918A. The ShipToLocation entity 29918A is the location at which goods have been delivered or a service provided. The ShipToLocation entity 29918A is of type GDT: BusinessTransactionDocumentLocation.

The ShipToLocation entity 29918A includes an Address entity 29922A. There is a 1:c relationship 29924A between the ShipToLocation entity 29918A and the Address entity 29922A. The Address entity 29922A includes a PersonName entity 29926A, an Office entity 29928A, a PhysicalAddress 29930A, a GeoCoordinates entity 29932A, and a Communication entity 29934A. There is a respective 1:c relationship 29936A, 29938A, 29940A, 29942A, and 29944A between the Address entity 29922A and the PersonName entity 29926A, the Office entity 29928A, the PhysicalAddress 29930A, the GeoCoordinates entity 29932A, and the Communication entity 29934A.

(iii) Service Acknowledgement Attachment Package

The Attachment package 29928 groups together the attachments relevant for the service acknowledgement. The Attachment package 29928 includes an Attachment entity 29946A. There is a 1:cn relationship 29948A between the ServiceAcknowledgement entity 29934 and the Attachment entity 29946A. The Attachment entity 29946A is any document that refers to the service acknowledgement. The Attachment entity 29946A is of type GDT: Attachment.

(iv) Service Acknowledgement Description Package

The Description package 29930 groups together the texts relevant for the service acknowledgement. The Description package 29930 includes a Description entity 29950A and a ConfirmationDescription entity 29952A. There is a 1:cn relationship 29954A between the ServiceAcknowledgement entity 29934 and the Description entity 29950A. There is also a 1:cn relationship 29956A between the ServiceAcknowledgement entity 29934 and the ConfirmationDescription entity 29956A.

The Description is a natural-language text regarding the service acknowledgement, which is visible to the business partner. The Description entity 29950A is of type GDT: Description. The Description entity 29950A may be used for the textual information about the transferred purchase order and not just the current message. An example of this is a note stating that the Purchasing employee responsible is on vacation as of a specific date and indicating the name and telephone number of a substitute as of this date.

The ConfirmationDescription is a natural-language text regarding the service acknowledgement confirmation, which is visible to the business partner. The ConfirmationDescription entity 29952A is of type GDT: Description. The ConfirmationDescription entity 29952A may be used for the textual information about the service acknowledgement confirmation. Reasons may be specified in the ConfirmationDescription entity 29952 as to why the entry has been rejected, for example.

(v) Service Acknowledgement Item Package

The Item package 29932 includes a ProductInformation package 29958A, a PricingInformation package 29960A, a Party package 29962A, a Location package 29964A, a BusinessTransactionDocumentReference package 29966A, an Attachment package 29968A, and a Description package 29970A. The Item package 29932 also includes the Item entity 29936. There is a 1:n relationship 29937 between the ServiceAcknowledgement entity 29934 and the ServiceAcknowledgement Item entity 29936. ServiceAcknowledgement Item entities are arranged hierarchically using a Hierarchy Relationship 29974A. The Item Hierarchy Relationship 28874A is the relationship between a sub-item and a higher-level parent item in an item hierarchy. There is a 1:cn relationship 29975A between the Item entity 29936 and its subordinate entities, and there is a 1:c relationship 29976A between the Item entity 29936 and its superordinate entities. The Item entity 29936 is of type GDT: ServiceAcknowledgementItem.

The ServiceAcknowledgement Item specifies a service (service product) entered by the ServiceAcknowledgement or additional information about the service (service product). The Item entity 29936 includes detailed information about a product, the price of the product, quantity, and date. The Item entity 29936 may contain references to other business documents relevant for the item. As described above, a Item entity 29936 may be subordinate to another Item entity 29936 within a hierarchy, thereby establishing a business relationship between the two items.

The Item entity 29936 includes an ID, a BuyerID, a ServiceEntryCompletedIndicator, a DeliveryPeriod, and a Quantity. The ID is an identifier assigned by the seller to a service acknowledgement item. The ID identifier is unique within a particular service acknowledgement and is of type GDT: BusinessTransactionDocumentItemID. The BuyerID is an identifier assigned by the buyer to a service acknowledgement item. The BuyerID identifier is unique within a particular service acknowledgement and is of type GDT: BusinessTransactionDocumentItemID. The ServiceEntryCompletedIndicator specifies whether or not confirmation for the referenced service acknowledgement item is complete and is of type GDT: BusinessTransactionCompletedIndicator. The DeliveryPeriod is a period for which the service was entered and is of type GDT: DateTimePeriod. The Quantity is the quantity entered and is of type GDT: Quantity.

Item entities 29936 are arranged hierarchically using a HierarchyRelationship 29974A. There are various item categories, which are governed by a variety of constraints. An item entity 29936 may have several constraint types. The description of the constraint types specifies which constraint types may be combined with each other and how.

Methods and systems consistent with the present invention contemplate the following constraint types: (1) Standard items; (2) Hierarchy items; (3) Subitems; (4) Material items; (5) Service items; (6) Unspecified product items; (7) Grouping hierarchy items; and (8) BOM hierarchy items.

Standard items are the items to which no lower-level items have been assigned in the hierarchy. An item that is not referenced by the ParentItemID of another item is a standard item.

Hierarchy items are items to which at least one other lower-level item has been assigned in the hierarchy. An item that is referenced by the ParentItemID of at least one other item is a hierarchy item. The items are either standard or hierarchy items.

Subitems are items that have been assigned below a hierarchy item and not directly to the purchase order header. Subitems may be both standard items and hierarchy items. Each item that references another item by the ParentItemID is a subitem.

Material items are items whose product is a material. Items whose ProductTypeCode is “1” (Material) are Material items.

Service items are items whose product is a service. Items whose ProductTypeCode is “2” (service) are service items.

Unspecified product items are items for which it is not specified whether they refer to a material or a service. Items whose ProductTypeCode is not specified are unspecified product items. The items are either material, service, or unspecified product items. An unspecified product item fulfills the constraints of a material or service.

Grouping hierarchy items are hierarchy items that logically group together other items. Multilevel grouping hierarchies are permitted, that is, a grouping hierarchy item may contain subitems that are also grouping hierarchy items. Hierarchy items whose subitems have HierarchyRelationshipTypeCode “002” (group) are grouping hierarchy items; subitems with a different HierarchyRelationshipTypeCode are not permitted. Grouping hierarchy items are not permitted as subitems of other types of hierarchy items.

BOM hierarchy items are hierarchy items that group together other items in a BOM. Multilevel BOM hierarchies are permitted. Hierarchy items with at least one subitem with HierarchyRelationshipTypeCode “001” (BOM) are BOM hierarchy items; other subitems are permitted with HierarchyRelationshipTypeCode “003” (discount in kind).

(a) Hierarchy Relationship

The HierarchyRelationship 29974A is the relationship between a subitem and a higher-level parent item in an item hierarchy. The HierarchyRelationship 29974A includes a ParentItemID, a ParentItemBuyerID, and a TypeCode. The ParentItemID is the reference to a parent item with the item number assigned by the seller, and is of type GDT: BusinessTransactionDocumentItemID. The ParentItemBuyerID is the reference to a parent item with the item number assigned by the buyer, and is of type GDT: BusinessTransactionDocumentItemID. The TypeCode represents the hierarchical relationship between the subitem and its higher-level parent item, and is of type GDT: BusinessTransactionDocumentItemHierarchyRelationshipTypeCode.

(b) Service Acknowledgement Item Product Information Package

The ProductInformation package 29958A groups together the information required for identifying, describing, and classifying a product or service acknowledgement item. The ProductInformation package 29958A includes a Product entity 29978A and a ProductCategory entity 29980A. In one implementation, the ProductInformation package 29958A is not used in grouping hierarchy items.

The Product entity 29978A includes the details about a product as generally understood from a commercial point of view in business documents. The Product entity 29978A is of type GDT: BusinessTransactionDocumentProduct. There is a 1:c relationship 29979A between the Item entity 29936 and the Product entity 29978A. With the exception of grouping hierarchy items, at least the product number or the product description is specified when a new item is created. If both the product number and description are specified, the description is merely additional information in the message and may be ignored by the recipient.

The ProductCategory entity 29980A includes the details about a product category as generally understood from a commercial point of view in business transaction documents. The ProductCategory entity 29980A includes details for identifying the product category using an internal ID, a standard ID, and IDs assigned by involved parties. The ProductCategory entity 29980A is of type GDT: BusinessTransactionDocumentProductCategory. There is a 1:c relationship 29982A between an Item entity 29936 and the ProductCategory entity 29980A. The product category is derived directly from the product if a product number is specified for the product. It may differ for the buyer and seller if they have classified the same product differently.

(c) Service Acknowledgement Item Price Information Package

The PriceInformation package 29960A groups together the price information for a service acknowledgement item. The PriceInformation package 29960A includes a Price entity 29984A. There is a 1:c relationship 29986A between an Item entity 29936 and the Price entity 29984A. The PriceInformation package 29960A is not used in the grouping hierarchy. In one implementation, the PriceInformation package 29960A for a service item includes prices only; it does not contain any information about how the prices are calculated.

The Price entity 29984A is the price specified by the seller for the service provided or material used. The Price entity 29984A includes a NetUnitPrice, which is the net price (without tax or cash discount) specified by the seller for the base quantity of the service or material, and is of type GDT: Price.

In BOM hierarchies, the following rules may apply for the Price:

(1) If the price is specified for the item at the top of the BOM hierarchy and not the subitems, this price applies.

(2) If the price is specified for standard items (end nodes in the hierarchy tree) in the BOM hierarchy, these prices apply. The price of the entire BOM is the total of the individual prices.

(3) If a price is specified at different levels in the BOM hierarchy, the price that appears above the others in the tree applies. Differences between the total of the individual prices and the price at the next highest hierarchy level are permissible. These may be caused by discounts for the entire BOM.

(d) Service Acknowledgement Item Party Package

The SeviceAcknowledgementItem Party package 29962A includes elements similar at header level to the ServiceAcknowledgement Party package 29924, such as a BuyerParty entity 29988A, a SellerParty entity 29990A, a ProductRecipientParty entity 29992A, a VendorParty entity 29994A, and a ManufacturerParty entity 29996A. There is a 1:c relationship 29900B between the Item entity 29936 and the BuyerParty entity 29988A. There is a 1:c relationship 29902B between the Item entity 29936 and the SellerParty entity 29990A. There is a 1:c relationship 29904B between the Item entity 29936 and the ProductRecipientParty entity 29992A. There is a 1:c relationship 29906B between the Item entity 29936 and the VendorParty entity 29994A. There is also a 1:c relationship 29908B between the Item entity 29936 and the ManufacturerParty entity 29996A.

Each of the BuyerParty entity 29988A, the SellerParty entity 29990A, the ProductRecipientParty entity 29992A, the VendorParty entity 29994A, and the ManufacturerParty entity 29996A includes the same elements as those described above for the BuyerParty entity 29938 as denoted by ellipses 29910B, 29912B, 29914B, 29916B and 29918B.

(e) Service Acknowledgement Item Location Package

The SeviceAcknowledgementItem Location package 29964A includes elements similar at header level to the ServiceAcknowledgement Location package 29926, such as a ShipToLocation entity 29920B. There is a 1:c relationship 29922B between the Item entity 29936 and the ShipToLocation entity 29920B. The ShipToLocation entity 29920B is of type GDT: BusinessTransactionDocumentLocation. ShipToLocation entity 29920B includes the same elements as those described above for the ShipToLocation entity 29926 as denoted by ellipse 29924B.

(f) Service Acknowledgement Item Business Transaction Document Reference Package The ServiceAcknowledgementItem-BusinessTransactionDocumentReference package ("BusinessTransactionDocumentReference package") 29966A groups together references to business documents that are relevant for the Item entity 29936 and have a business relationship with the item. The BusinessTransactionDocumentReference package 29966A includes a PurchaseOrderReference entity 29926B, a PurchaseContractReference entity 29928B, a SalesContractReference entity 29930B, a BuyerProductCatalogueReference entity 29932B, and a SellerProductCatalogueReference entity 29934B. In one implementation, none of the entities in the BusinessTransactionDocumentReference package may be used in grouping hierarchy items. There is a 1:c relationship 29936B between the Item entity 29936 and the PurchaseOrderReference entity 29926B. There is a 1:c relationship 29938B between the Item entity 29936 and the PurchaseContractReference entity 29928B. There is a 1:c relationship 29940B between the Item entity 29936 and the SalesContractReference entity 29930B. There is a 1:c relationship 29942B between the Item entity 29936 and the BuyerProductCatalogueReference entity 29932B. There is a 1:c relationship 29944B between the Item entity 29936 and the SellerProductCatalogueReference entity 29934B.

The PurchaseOrderReference is a reference to a purchase order or item in a purchase order. The PurchaseOrderReference entity 29926B is of type GDT: BusinessTransactionDocumentReference. In one implementation, the PurchaseOrderReference entity 29926B references one item such that one ItemID is required.

The PurchaseContractReference is a reference to a purchase contract or item in a purchase contract. The PurchaseContractReference entity 29928B is of type GDT: BusinessTransactionDocumentReference. In one implementation, the PurchaseContractReference entity 29928B references one item such that one ItemID is required. Provided it has not been agreed otherwise, the seller is responsible for determining the correct SalesContractReference entity 29930B for a specified PurchaseContractReference entity 29928B.

The SalesContractReference is a reference to a sales contract or an item within a sales contract. The SalesContractReference entity 29930B is of type GDT: BusinessTransactionDocumentReference. In one implementation, the SalesContractReference entity 29930B references one item such that one ItemID is required.

The BuyerProductCatalogueReference is a reference to the buyer's product catalog or an item within the buyer's product catalog. The BuyerProductCatalogueReference entity 29932B is of type GDT: CatalogueReference. In one implementation, the BuyerProductCatalogueReference entity 29932B references one item such that one ItemID is required. The BuyerProductCatalogueReference entity 29932B is filled when a service acknowledgement item refers to a catalog whose number and item numbers were assigned by the buyer. In the service acknowledgement process, the BuyerProductCatalogueReference entity 29932B may be used as a substitute product number if a separate master record has not been created for a product and the product is defined in a catalog.

The SellerProductCatalogueReference entity 29934B is a reference to the seller's product catalog or an item within the seller's product catalog. The SellerProductCatalogueReference entity 29934B is of type GDT: CatalogueReference. The SellerProductCatalogueReference entity 29934B references one item such that one ItemID is required. The SellerProductCatalogueReference entity 29934B is filled when a service acknowledgement item refers to a catalog whose number and item numbers were assigned by the seller. In the service acknowledgement process, the SellerProductCatalogueReference entity 29934B may be used as a substitute product number if a separate master record has not been created for a product and the product is defined in a catalog.

(g) Service Acknowledgement Item Attachment Package

The SeviceAcknowledgementItem Attachment package 29968A includes elements similar at header level to the ServiceAcknowledgement Attachment package 29928, such as an Attachment entity 29946B. There is a 1:cn relationship 29948B between the Item entity 29936 and the Attachment entity 29946B. The Attachment entity 29946B is of type GDT: BusinessTransactionDocumentLocation.

(h) Service Acknowledgement Item Description Package

The Description package 29970A groups together the explanatory texts regarding a service acknowledgement item. The Description package 29970A includes a Description entity 29950B and a ConfirmationDescription entity 29952B. There is a 1:c relationship 29954B between the Item entity 29936 and the Description entity 29950B. There is also a 1:c relationship 29956B between the Item entity 29936 and the ConfirmationDescription entity 29952B.

The Description is a natural-language text regarding a service acknowledgement that may be visible to the business partner. The Description entity 29950B is of type GDT: Description. The Description may be used for the types of textual information about the service acknowledgement item. An example is an accurate description of a fault in need of repair.

A ConfirmationDescription is a natural-language text regarding the confirmation of a service acknowledgement item that may be visible to the business partner. The ConfirmationDescription entity 29952A is of type GDT: Description. The ConfirmationDescription entity 29952A may be used for the textual information about the confirmation of a service acknowledgement item. An example of this would be the seller's justification for rejecting a particular service acknowledgement item.

(3) Message Data Type Element Structure

FIGS. 300A-L depict the element structure for a Sevice-AcknowledgementRequest and a ServiceAcknowledgement-Confirmation. The element structure is similar to the above described data model of the message data type ServiceAcknowledgementMessage as reflected in FIGS. 299A-J, but provides additional information regarding the details for interfacing with or implementing a ServiceAcknowledgementMessage, such as a SeviceAcknowledgementRequest and a ServiceAcknowledgementConfirmation. As shown in FIGS. 300A-L, the element structure identifies the different packages 30000 that may be in a respective ServiceAcknowlegementRequest and ServiceAcknowledgementConfirmation. The element structure for the ServiceAcknowlegementRequest and ServiceAcknowledgementConfirmation includes five levels 30002, 30004, 30006, 30008 and 30010 each of associated with a respective package 30000. The element structure identifies the cardinality 30012 and data type information (i.e., type 30014 and name 30016) for the elements at the respective levels 30002, 30004, 30006, 30008 and 30010 in a package 30000.

The outermost package of this interface is a ServiceAcknowledgement package 30020, which includes a Service-AcknowledgementMessage entity 30022 at the first level 30002. The ServiceAcknowledgementMessage entity 30022 is of message data type ("MDT") 30024 ServiceAcknowledgementMessage 30026.

The ServiceAcknowledgementMessage package 30020 includes a MessageHeader package 30028 and a ServiceAcknowledgement package 30030. The MessageHeader package 30028 includes a MessageHeader entity 30032, which is of type generic data type ("AGDT") 30036 "BusinessDocumentMessageHeader" 30038. There is one 30034 Message-Header entity for each ServiceAcknowledgementMessage entity 30022.

The MessageHeader entity 30032 includes an ID 30040, a Reference ID 30048, and a CreationDateTime 30056. The ID 30040 is of type GDT 30044 BusinessDocumentMessageID 30046. The ReferenceID 30048 is of type GDT 30052 BusinessDocumentMessageID 30054. The CreationDateTime 30056 is of type GDT 30060 DateTime 30062. There is one 30042 ID 30040 for each MessageHeader entity 30032, one or zero 30050 ReferenceID 30052 for each MessageHeader entity 30032, and one 30058 CreationDateTime 30056 for each MessageHeader entity 30032.

The MessageHeader entity 30032 also includes a Sender-Party entity 30064 and a RecipientParty entity 30020A. The SenderParty entity 30064 is of type AGDT 30068 Business-DocumentMessageHeaderParty 30070. The RecipientParty entity 30020A is also of type AGDT 30024A BusinessDocumentMessageHeaderParty 30026A. There is one or zero 30066 SenderParty entity 30064 for each MessageHeader entity 30032, and there is any number 30022A of Recipient-Party entities 30020A for each MessageHeader entity 30032.

The SenderParty entity 30064 includes an InternalID 30072, a StandardID 30080, and a ContactPerson 30088. The InternalID 30072 is of type GDT 30076 PartyInternalID 30078. The StandardID 30080 is of type GDT 30084 Party-StandardlID 30086. The ContactPerston 30088 is of type AGDT 30092 ContactPerson 30094. There is one or zero 30074 InternalID 30072 for each SenderParty entity 30064, any number 30082 of StandardIDs 30080 for each Sender-Party entity 30064, and one or zero 30090 ContactPerson 30088 for each SenderParty entity 30064.

The ContactPerson 30088 includes a BuyerID 30096, a VendorID 30004A, and an Address 30012A. The BuyerID 30096 is of type CDT 30000A ContactPersonPartyID 30002A. The VendorID 30004A is of type CDT 30006A ContactPersonPartyID 30010A. The Address 30012A is of type AGDT 30016A Address 30018A. There is one or zero 30098 BuyerID 30096 for each ContactPerson 30088, one or zero 30006A of VendorID 30004A for each ContactPerson 30088, and one or zero 30014A Address 30012A for each ContactPerson 30088.

The ServiceAcknowledgement package 30030 includes a ServiceAcknowledgement entity 30028A. There is one 30030A ServiceAcknowledgement entity 30028A for each ServiceAcknowledgementMessage entity 30022A. The ServiceAcknowledgement entity 30028A is of type AGDT 30032A ServiceAcknowledgement 30034A. The ServiceAcknowledgement entity 30028A includes an ID 30036A, a BuyerID 30046A, a CreationDateTime 30054A, an AcceptanceStatusCode 30064A, and a Note 30074A. The ID 30036A is of type GDT 30040A BusinessTransactionDocumentID 30042. The BuyerID 30046A is of type GDT 30050A BusinessTransactionDocumentID 30052A. The CreationDateTime 30054A is of type GDT 30058A DateTime 30060A. The AcceptanceStatusCode 30064A is of type GDT 30068A AcceptanceStatusCode 30070A. The Note 30074A is of type GDT 30078A Note 30080A. There is one 30038A ID 30036A for each ServiceAcknowledgement entity 30028A. There is one or zero 30048A BuyerID 30046A for each ServiceAcknowledgement entity 30028A. There is zero or one 30056A CreationDateTime 30054A for each ServiceAcknowledgement entity 30028A. There is zero or one 30066A AcceptanceStatusCode 30064A for each ServiceAcknowledgement entity 30028A. There is one or zero 30076A Note 30074A for each ServiceAcknowledgement entity 30028A. ID 30036A may be associated with PIDX element FieldTicketProperties-FieldTicketNumber 30044A. CreationDateTime 30054A may be associated with PIDX element FieldTicketProperties-FieldTicketDate 30062A. AcceptanceStatusCode 30064A may be associated with PIDX element FieldTicketResponse-LineItem-LineStatusCode 30072A.

The ServiceAcknowledgement package 30030 also includes a Party package 30082A, a Location package 30084A, an Attachment package 30086A, a Description package 30088A, and an Item package 30090A.

The Party package 30082A includes a BuyerParty entity 30092A, a SellerParty entity 30066B, a ProductRecipient-Party entity 30076B, a VendorParty entity 30086B, and a ManufacturerParty entity 30096B. The BuyerParty entity 30092A is of type AGDT 30096A BusinessTransactionDocumentParty 30098A. There is one or zero 30094A BuyerParty entity 30092A for each ServiceAcknowledgement entity 30028A. The SellerParty entity 30066B is of type AGDT 30070B BusinessTransactionDocumentParty 30072B. There is one or zero 30068B SellerParty entity 30066B for each ServiceAcknowledgement entity 30028A. The ProductRecipientParty entity 30076B is of type AGDT 30080B BusinessTransactionDocumentParty 30082B. There is one or zero 30078B ProductRecipientParty entity 30076B for each ServiceAcknowledgement entity 30028A. The VendorParty entity 30086B is of type AGDT 30090B BusinessTransactionDocumentParty 30092B. There is one or zero 30088B VendorParty entity 30086B for each ServiceAcknowledgement entity 30028A. The ManufacturerParty entity 30096B is of type AGDT 30000C BusinessTransactionDocumentParty 30002C. There is one or zero 30098B ManufacturerParty entity 30096B for each ServiceAcknowledgement entity 30028A. BuyerParty 30092A may be associated with PIDX element PartnerInformation (all Parties) 30000B. SellerParty 30066B may be associated with PIDX element PartnerInformation 30074B. ProductRecipientParty 30076B may be associated with PIDX element PartnerInformation 30084B. VendorParty 30086B may be associated with PIDX element PartnerInformation and CountryOfOrigin 30094B. ManufacturerParty 30096B may be associated with PIDX element PartnerInformation 30004C.

The BuyerParty entity 30092A includes a StandardID entity 30002B, a BuyerID entity 30010B, a SellerID entity 30018D, an Address entity 30026B and a ContractPerson entity 30034B. The StandardID entity 30002B is of type CDT 30006B PartyStandardID 30008D. The BuyerID entity 30010B is of type CDT 30014B PartyPartyID 30008D. The SellerID entity 30018D is of type CDT 30022B PartyPartyID 30024B. The Address entity 30026B is of type AGDT 30030B Address 30032B. The ContactPerston entity 30034B is of type AGDT 30038B ContractPerson 30040B. There is any number 30004B of StandardID entities 30002B for each BuyerParty entity 30092A, one or zero 30012B BuyerID entity 30010B for each BuyerParty entity 30092A, one or zero 30020B SellerID entity 30018B for each BuyerParty entity 30092A, one or zero 30028B Address entity 30026B for each BuyerParty entity 30092A, and one or zero 30036B ContractPerson entity 30034B for each BuyerParty entity 30092A.

The ContractPerson entity 30034B includes a BuyerID entity 30042B, a SellerID entity 30050B, and an Address entity 30058B. The BuyerID entity 30042B is of type CDT 30046B ContactPersonPartyID 30048B. The SellerID entity 30050B is of type CDT 30054B ContactPersonPartyID 30056B. The Address entity 30058B is of type AGDT 30062B Address 30064B. There is one or zero 30044B BuyerID entity 30042B for each ContractPerson entity 30034A, one or zero 30052B SellerID entity 30050B for each ContractPerson entity 30034B, and one or zero 30060B Address entity 30058B for each ContractPerson entity 30034B.

The Location Package 30084A includes a ShipToLocation entity 30006C. The ShipToLocation entity 30006C is of type AGDT 30010C BusinessTransactionDocumentLocation 30012C. There is one or zero 30008C ShipToLocation entity 30006C for each ServiceAcknowledgement entity 30028A.

The ShipToLocation entity 30006C includes a StandardID entity 30016C, a BuyerID entity 30024C, a SellerID entity 30032C, and an Address entity 30040C. The StandardID entity 30016C is of type CDT 30020C LocationStandardID 30022C. The BuyerID entity 30024C is of type CDT 30028C LocationPartyID 30030C. The SellerID entity 30032C is of type CDT 30036C LocationPartyID 30038C. The Address entity 30040C is of type AGDT 30044C Address 30046C. There is any number 30018C of StandardID entities 30016C for each ShipToLocation entity 30006C, one or zero 30026C BuyerID entity 30024C for each ShipToLocation entity 30006C, one or zero 30034C SellerID entity 30032C for each ShipToLocation entity 30006C, and one or zero 30042C Address entities 30040C for each ShipToLocation entity 30006C. ShipToLocation 30006C may be associated with PIDX element CountryOfFinalDestination 30014C.

The Attachment package 30086A includes an Attachment entity 30048C, which is of type AGDT 30052C Attachment 30054C. There is any number 30050C of Attachment entities 30048C for each ServiceAcknowledgement entity 30028A. Attachment 30048C may be associated with PIDX element FieldTicketProperties-Attachment 30056C.

The Description package 30088A includes a Description entity 30058C and a ConfirmedDescription entity 30068C. The Description entity 30058C is of type GDT 30062C Description 30064C. There is one or zero 30060C Description entity 30058C for each ServiceAcknowledgement entity 30028A. The ConfirmedDescription entity 30068C is of type GDT 30072C Description 30074C. There is one or zero 30070C ConfirmedDescription entity 30068C for each ServiceAcknowledgement entity 30028A. Description 30058C may be associated with PIDX element FieldTicketProperties-Comment and -JobSummary 30066C.

The Item package 30090A includes an Item entity 30076C. There is one or more 28060C Item entities 28058C for each ServiceAcknowledgement entity 30028A. The Item entity 30076C is of type AGDT 30080C ServiceAcknowledgement-Item 30082C.

The Item entity 30076C includes an ID 30084C, a BuyerID 30094C, a ServiceEntryCompletedIndicator 30002D, a DeliveryPeriod 30010D, a Quantity 30020D, and a HierarchyRelationship 30030D. The ID 30084C is of type GDT 30088C BusinessTransactionDocumentItemID 30090C, and there is one 30086C ID 30084C for each Item entity 30076C. The BuyerID 30094C is of type GDT 30098C BusinessTransactionDocumentItemPartyID 30000D, and there is one or zero 30096C BuyerID 30094C for each Item entity 30076C. The ServiceEntryCompletedIndicator 30002D is of type GDT 30006D BusinessTransactionCompletedIndicator 30008D, and there is one or zero 30004D ServiceEntryCompletedIndicators 30002D for each Item entity 30076C. The DeliveryPeriod entity 30010D is of type GDT 30014D DateTimePeriod 30016D, and there is one or zero 30012D DeliveryPeriod entity 30010D for each Item entity 30076C. The Quantity 30020D is of type GDT 30024D Quantity 30026D, and there is one or zero 30022D Quantity 30026D for each Item entity 30076C. There is one or zero 30032D HierarchyRelationship 30030D for each Item entity 30076C. The HierarchyRelationship 30030D includes a ParentItemID 30036D, which is of type GDT 30040D BusinessTransactionDocumentItemID 30042D, a ParentItemBuyerID 30044D, which is of type GDT 30048D BusinessTransactionDocumentItemID 30050D, and a TypeCode 30052D, which is of type GDT 30056D BusinessTransactionDocumentItemHierarchyRelationshipTypeCode 30058D. There is one or zero 30038D ParentItemID 30036D for each HierarchyRelationship 30030D. There is one or zero 30046D ParentItemBuyerID 30044C for each HierarchyRelationship 30030D. There is one 30054D TypeCode 30052D for each HierarchyRelationship 30030D. ID 30084C may be associated with PIDX element FieldTicketLineItem-LineItemNumber 30092C. DeliveryPeriod 30010D may be associated with PIDX element FieldTicketLineItem-ServiceDateTime 30018D. Quantity 30020D may be associated with PIDX element FieldTicketProperties-FieldTicketQuantity 30028D. HierarchyRelationship 30030D may be associated with PIDX element FieldTicketSubLineItem 30034D.

The Item package 30090A also includes a ProductInformation package 30060D, a PriceInformation package 30062D, a Party package 30064D, a Location package 30066D, a BusinessTransactionDocumentReference package 30068D, an Attachment package 30070D and a Description package 30072D.

The ProductInformation package 30060D includes a Product entity 30074D and a ProductCategory entity 30032E. The Product entity 30074D is of type AGDT 30078D BusinessTransactionDocumentProduct 30080D. There is one or zero 30076D Product entity 30074D for each Item entity 30076C. The ProductCategory entity 30032E is of type AGDT 30036E BusinessTransactionDocument-ProductCategory 30038E. There is one or zero 30034E ProductCategory entity 30032E for each Item entity 30076C.

The Product entity 30074D includes a StandardID entity 30084D, a BuyerID entity 30092D, a SellerID entity 30000E, a ManufacturerID 30008E, a TypeCode entity 30016E and a Note entity 30024E. The StandardID entity 30084D is of type CDT 30088D ProductStandardID 30090D. The BuyerID entity 30092D is of type CDT 30096D ProductPartyID 30098D. The SellerID entity 30000E is of type CDT 30004E ProductPartyID 30006E. The ManufacturerID entity 30008E is of type CDT 30012E ProductPartyID 30014E. The TypeCode entity 30016E is of type GDT 30020E ProductTypeCode 30022E. The Note entity 30024E is of type GDT 30028E Note 30030E. There is any number 30086D of StandardID entities 30084D for each Product entity 30074D, one or zero 30094D BuyerID entity 30092D for each Product entity 30074D, one or zero 30002E SellerID entity 30000E for each Product entity 30074D, one or zero 30010E The ManufacturerID entity 30008E for each Product entity 30074D, one or zero 30018E TypeCode entity 30016E for each Product entity 30074D and one or zero 30026E Note entity 30024E for each Product entity 30074D.

The ProductCategory entity 30032E includes a StandardID entity 30040E, a BuyerID entity 30048E, and a SellerID entity 30056E. The StandardID entity 30040E is of type CDT 30044E ProductCategoryStandardID 30046E. The BuyerID entity 30048E is of type CDT 30052E ProductCategoryPartyID 30054E. The SellerID entity 30056E is of type CDT 30060E ProductCategoryPartyID 30062E. There is any number 30042E of StandardID entities 30040E for each ProductCategory entity 30032E, one or zero 30050E BuyerID entity 30048E for each ProductCategory entity 30032E, and one or zero 30058E SellerID entity 30056E for each ProductCategory entity 30032E. Product 30074D may be associated with PIDX element FieldTicketProperties-LineItemInformation 30082D.

The PriceInformation package 30062D includes a Price entity 30064E. There is one or zero 30066E Price entity 30064E for each Item entity 30076C. The Price entity 30064E includes a NetUnitPrice 30070E. The NetUnitPrice 30070E is of type AGDT 30074E Price 30076E. There is one or zero 30072E NetUnitPrice 30070E for each Price entity 30064E. Price 30064E may be associated with PIDX element FieldTicketLineItem-Pricing 30068E. NetUnitPrice 30070E may be associated with PIDX element PrimaryCurrency 30078E.

The Party package 30064D includes a BuyerParty entity 30080E, a SellerParty entity 30090E, a ProductRecipientParty entity 30000F, a VendorParty entity 30010F, and a ManufacturerParty entity 30020F. The BuyerParty entity 30080E is of type AGDT 30084E BusinessTransactionDocumentParty 30086E. There is one or zero 30082E BuyerParty entity 30080E for each Item entity 30076C. The SellerParty entity 30090E is of type AGDT 30094E BusinessTransactionDocumentParty 30096E. There is one or zero 30092E SellerParty entity 30090E for each Item entity 30076C. The ProductRecipientParty entity 30000F is of type AGDT 30004F BusinessTransactionDocumentParty 30006F. There is one or zero 30002F ProductRecipientParty entity 30000F for each Item entity 30076C. The VendorParty entity 30010F is of type AGDT 30014F BusinessTransactionDocumentParty 30016F. There is one or zero 30012F VendorParty entity 30010F for each Item entity 30076C. The ManufacturerParty entity 30020F is of type AGDT 30024F BusinessTransactionDocumentParty 30026F. There is one or zero 30022F ManufacturerParty entity 30020F for each Item entity 30076C. BuyerParty 30080E may be associated with PIDX element PartnerInformation 30088E. SellerParty 30090E may be associated with PIDX element PartnerInformation 30098E. ProductRecipientParty 30000F may be associated with PIDX element PartnerInformation 30008F. VendorParty 30010F may be associated with PIDX element PartnerInformation and CountryOfOrigin 30018F. ManufacturerParty 30020F may be associated with PIDX element PartnerInformation 30028F.

The Location package 30066D includes a ShipToLocation entity 30030F. The ShipToLocation entity 30030F is of type AGDT 30034F BusinessTransactionDocumentLocation 30036F, and there is one or zero 30032F ShipToLocation entity 30030F for each Item entity 30076C.

The BusinessTransactionDocumentReference package 30068D includes a PurchaseOrderReference entity 30038F, a PurchaseContractReference entity 30048F, a SalesContractReference entity 30058F, a BuyerProductCatalogueReference entity 30066F, and a SellerProductCatalogueReference entity 30074F. The PurchaseOrderReference entity 30038F is of type AGDT 30042F BusinessTransactionDocumentReference 30044F. There one or zero 30040F of PurchaseOrderReference entities 30038F for each Item entity 30076C. The PurchaseContractReference entity 30048F is of type AGDT 30052F BusinessTransactionDocumentReference 30054F. There is one or zero 30050F PurchaseContractReference entity 30048F for each Item entity 30076C. The SalesContractReference entity 30058F is of type AGDT 30062F BusinessTransactionDocumentReference 30064F. There is one or zero 30060F SalesContractReference entity 30058F for each Item entity 30076C. The BuyerProductCatalogueReference entity 30066F is of type AGDT 30070F CatalogueReference 30072F. There is one or zero 30068F BuyerProductCatalogueReference entity 30066F for each Item entity 30076C. The SellerProductCatalogueReference entity 30074F is of type AGDT 30078F CatalogueReference 30080F. There is one or zero 30076F SellerProductCatalogueReference entity 30074F for each Item entity 30076C. PurchaseOrderReference 30028F may be associated with PIDX element FieldTicketLineItem-PurchaseOrderInformation 30046F. PurchaseContractReference 30048F may be associated with PIDX element FieldTicketLineItem-ReferenceInformation 30056F.

The Attachment package 30070D includes an Attachment entity 30082F, which is of type AGDT 30086F Attachment 30088F. There is one or zero 30084F Attachment entities 30082F for each Item entity 30076C. Attachment 30082F may be associated with PIDX element FieldTicketLineItem-Attachment 30090F.

The Description package 30072D includes a Description entity 30092F and a ConfirmedDescription entity 30002G. The Description entity 30092F is of type GDT 30096F Description 30098F. There is one or zero 30094F Description entity 30092F for each Item entity 30076C. The ConfirmedDescription entity 30002G is of type GDT 30006G Description 30008G. There is one or zero 30004G ConfirmedDescription entity 30002G for each Item entity 30076C. Description 30092F may be associated with PIDX element FieldTicketLineItem-Comment and -JobSummary 30000G.

e) RFQ, RFQ Cancellation, RFQ Result, Quote Interfaces

Request for quotation ("RFQ") interfaces are the interfaces that are required in a B2B process to exchange RFQs and quotations between a buyer and a bidder and finally to communicate the quotation acceptance. More than just a simple interface structure, the RFQ interfaces define the underlying business logic and, at the same time, dispense with the need to exchange proprietary information in straightforward RFQ processes. In this way, applications that implement the RFQ interfaces can be integrated without the need for complex project work.

(1) Message Choreography

Figure 301:
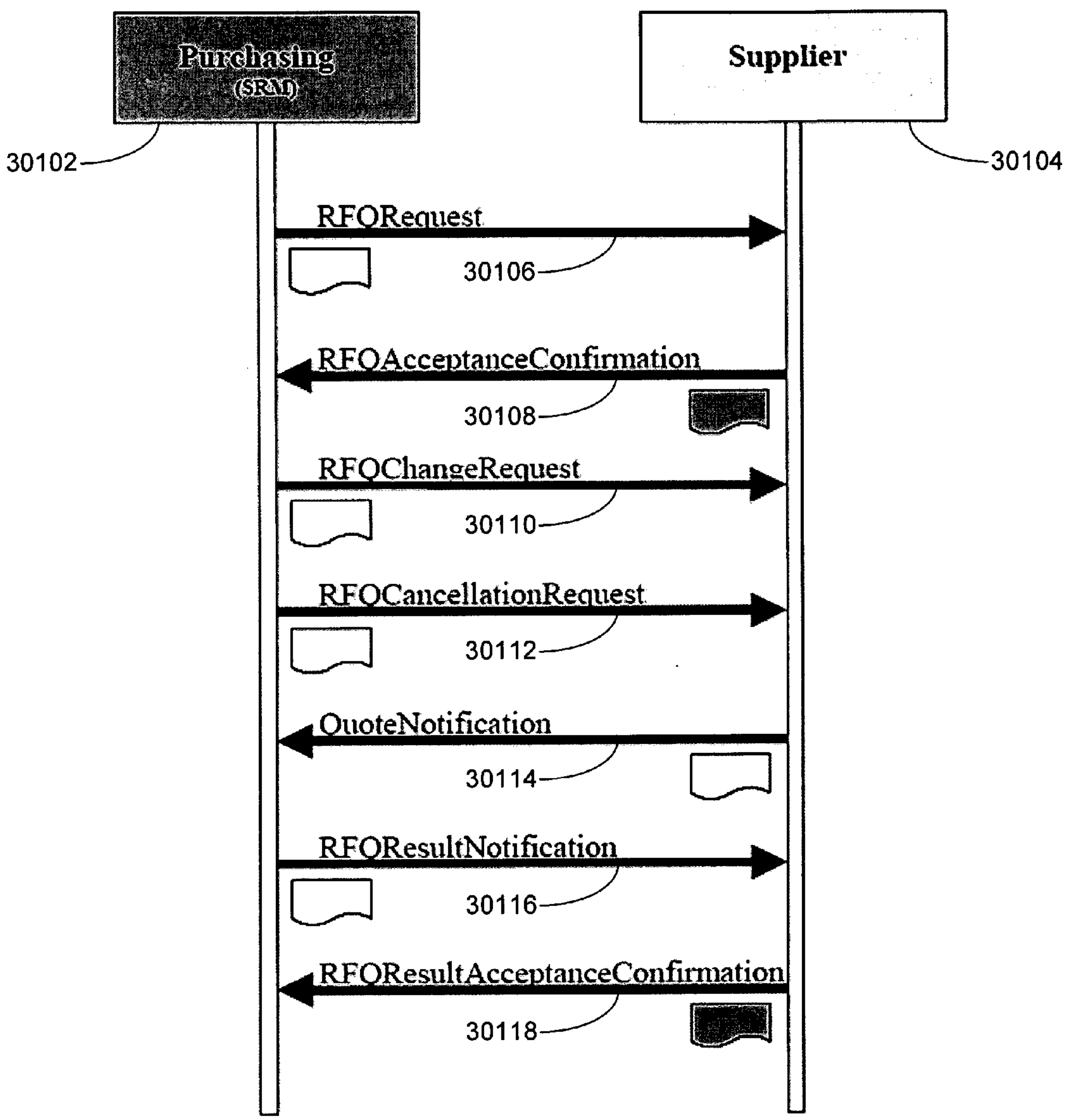
FIG. 301 depicts the message choreography for the RFQ interfaces in accordance with methods and systems consistent with the present invention.
Figure 302A:
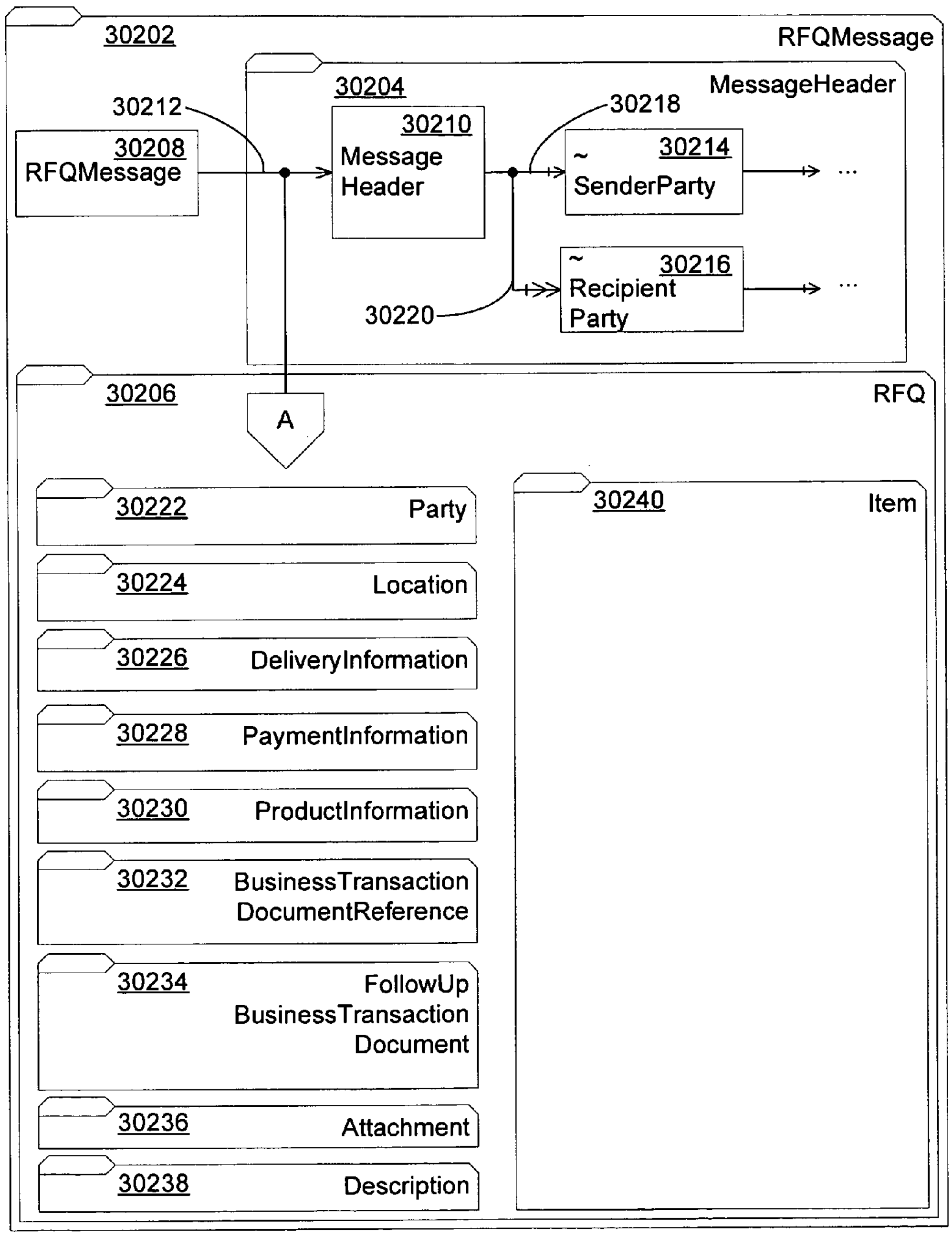
FIGS. 302A-K depict the data model for the RFQ interfaces in accordance with methods and systems consistent with the present invention.
Figure 302B:
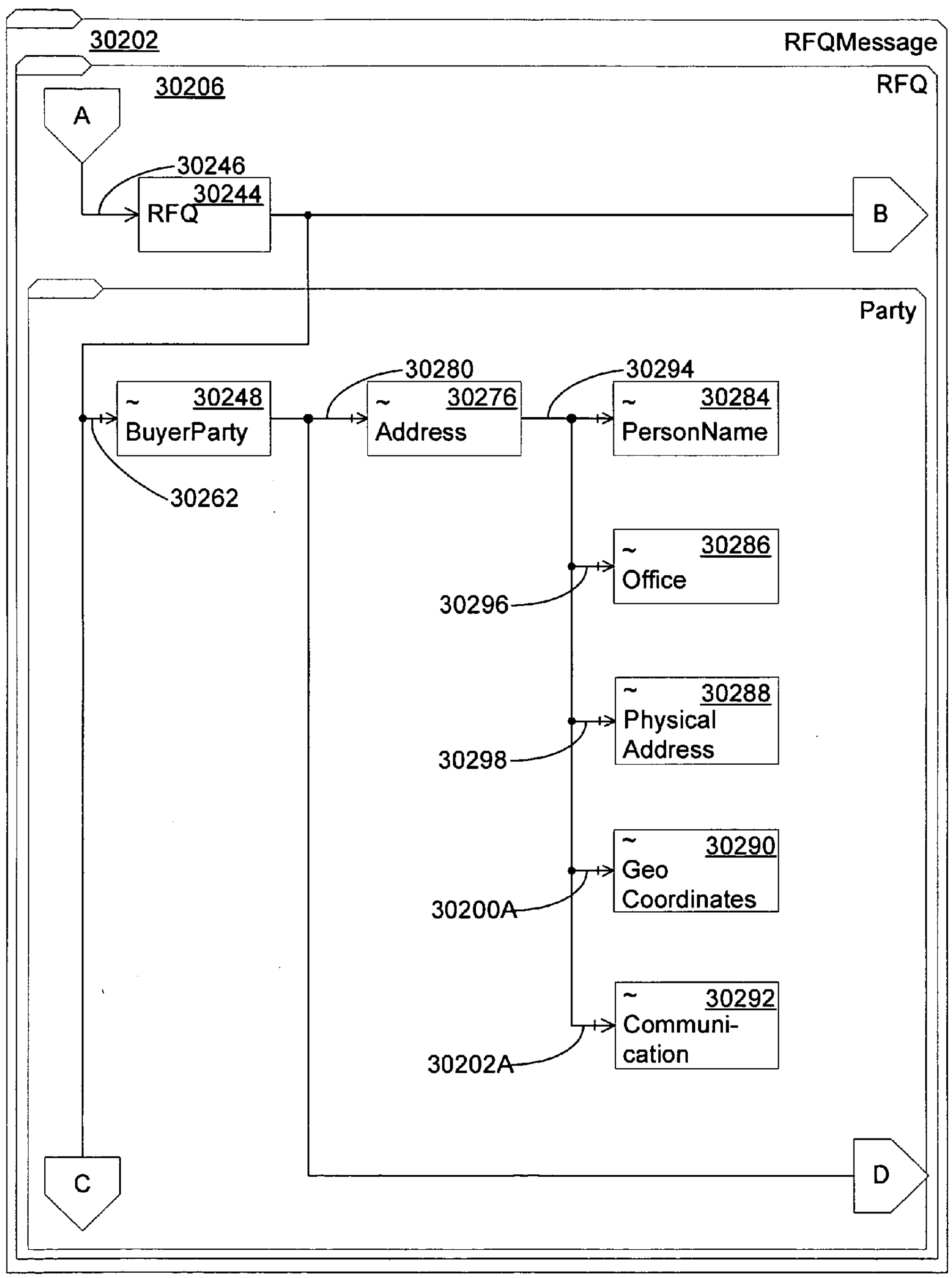
Figure 302C:
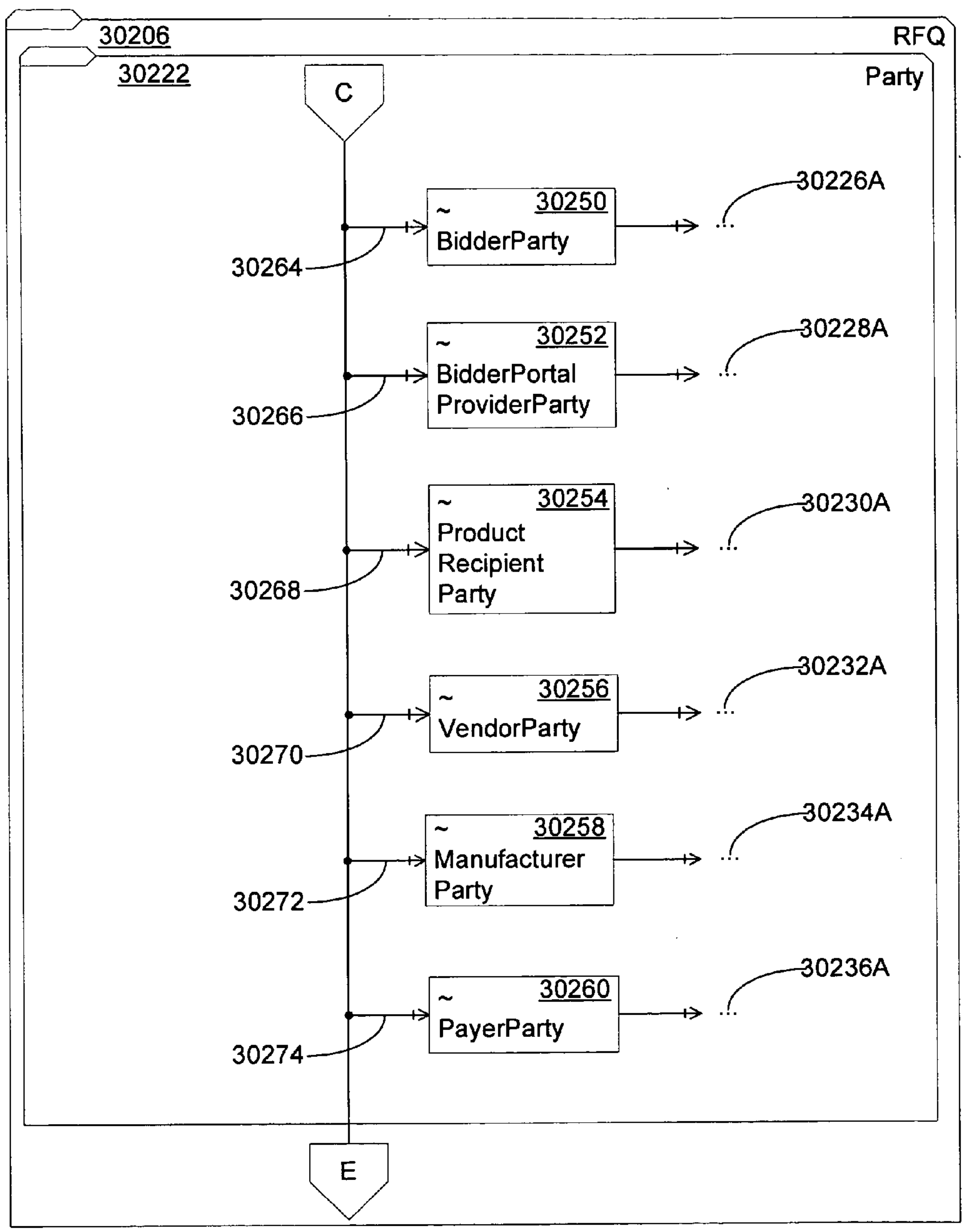
Figure 302D:
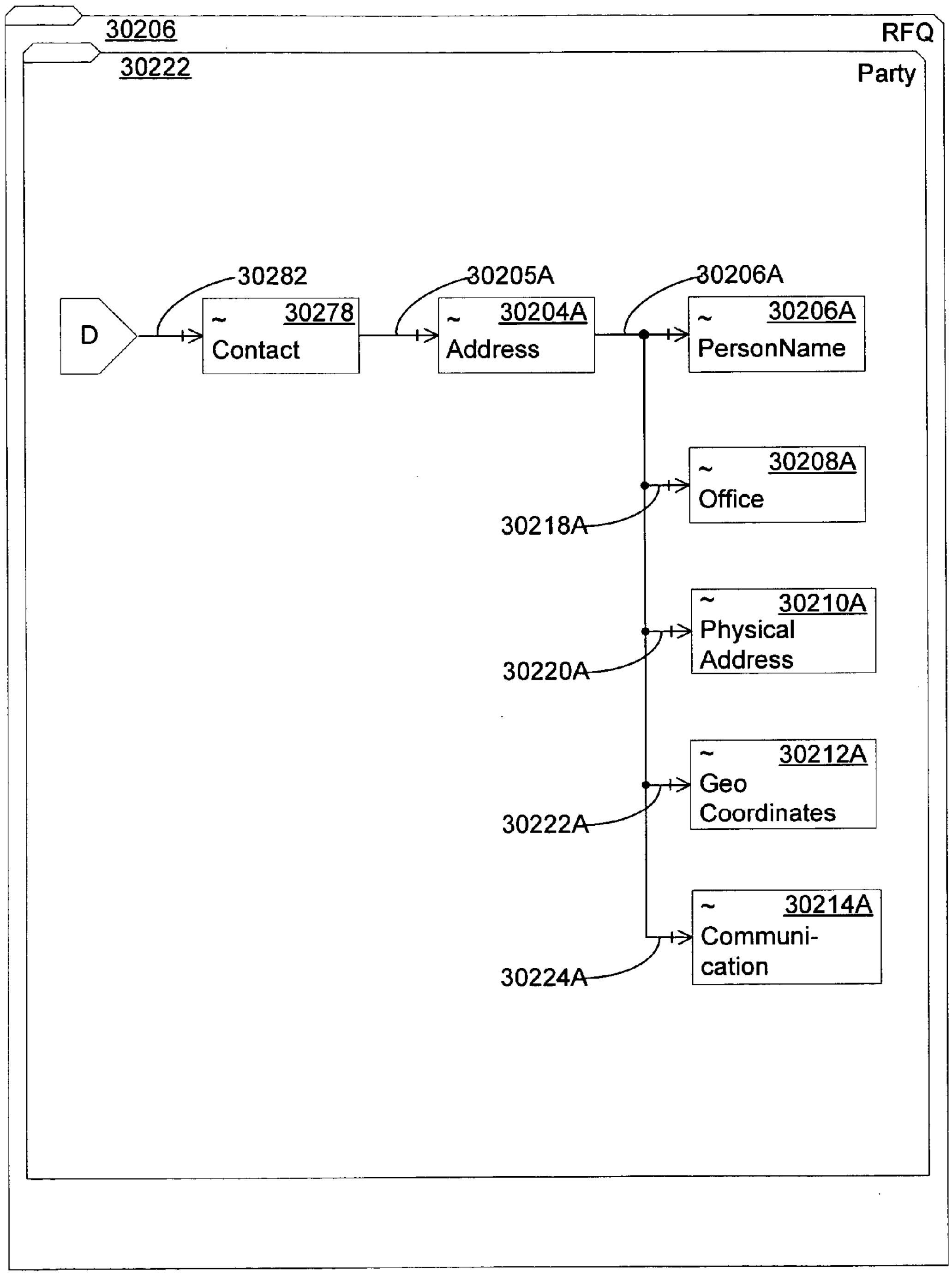
Figure 302E:
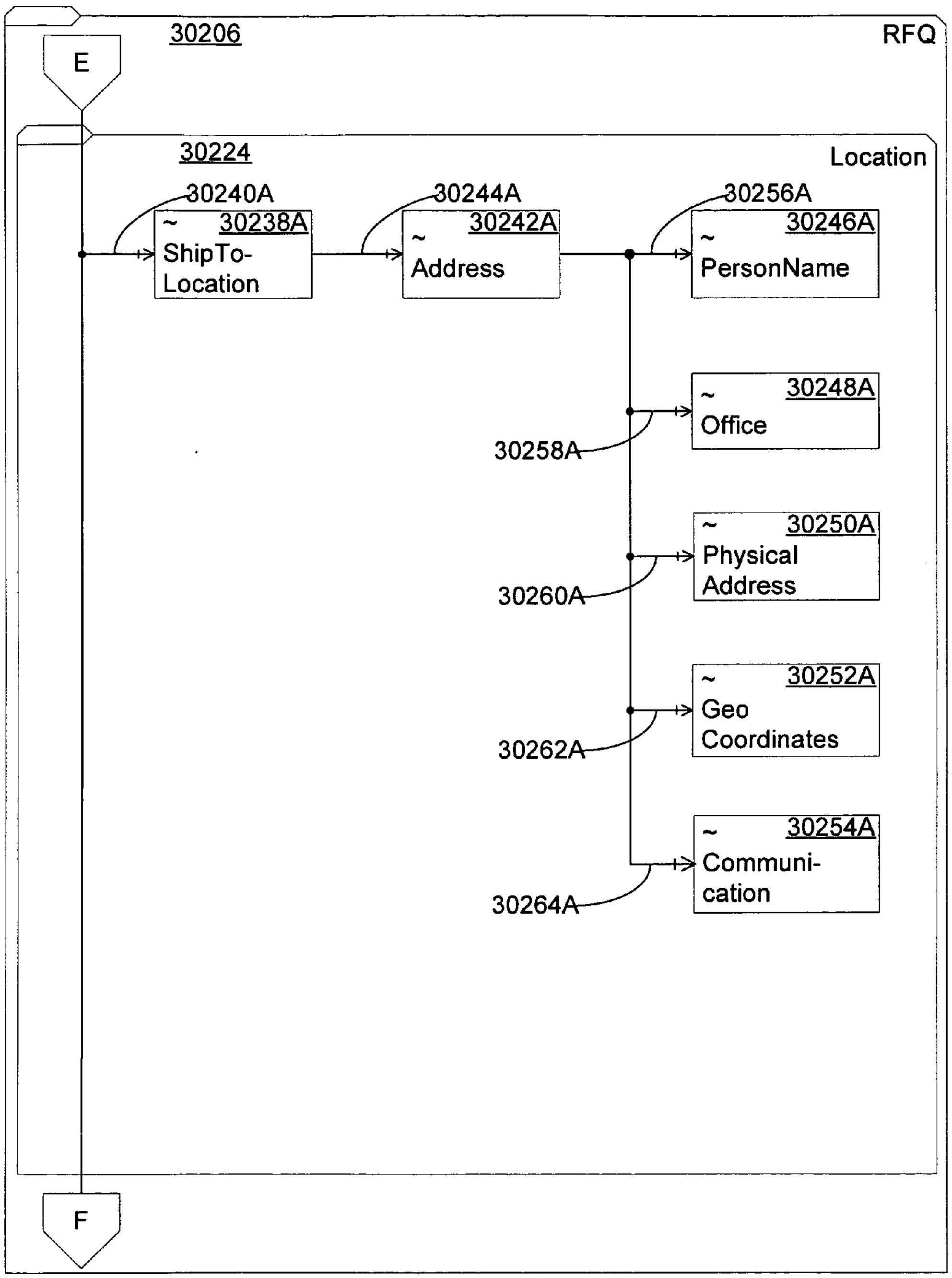
Figure 302F:
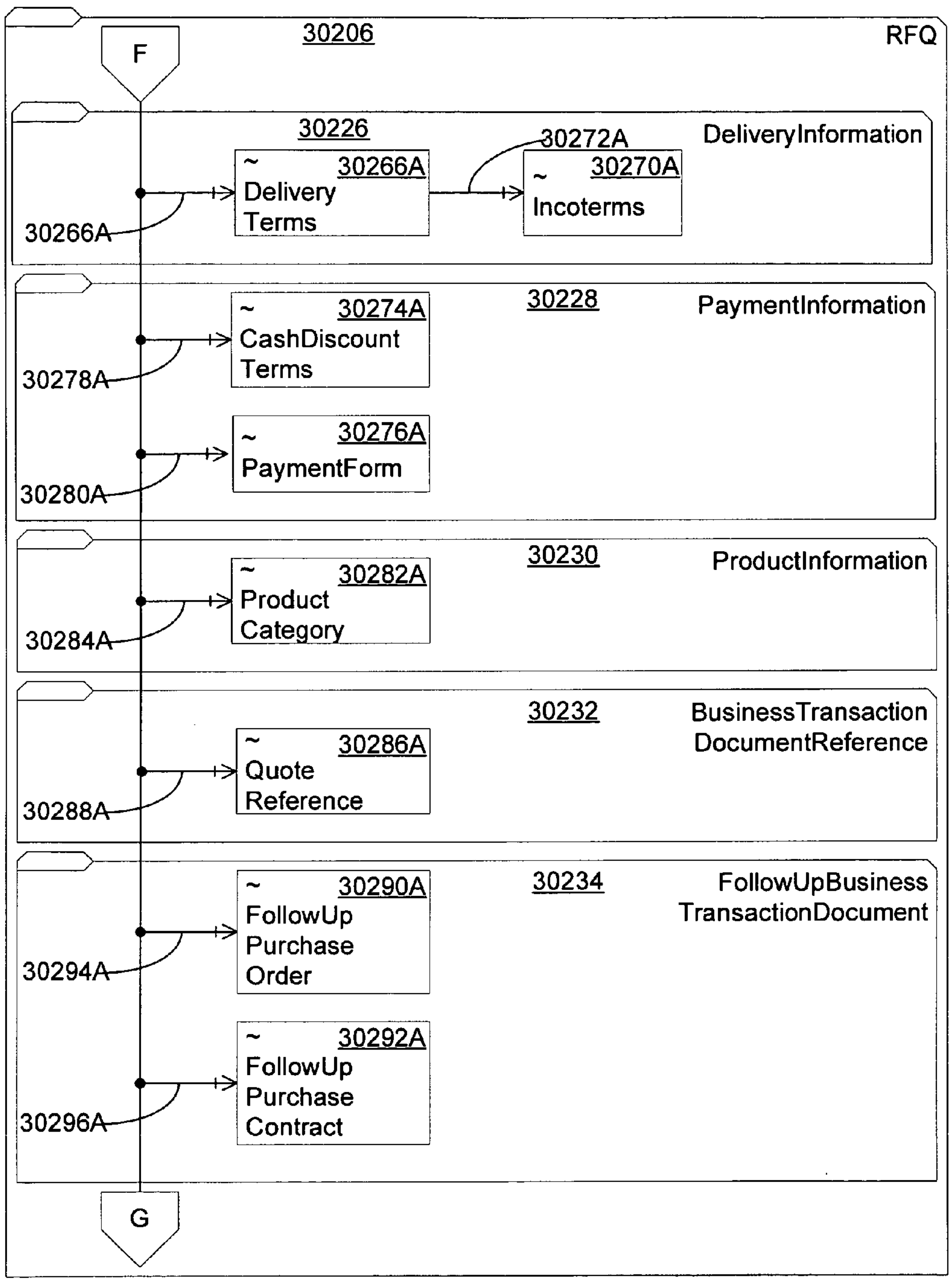
Figure 302G:
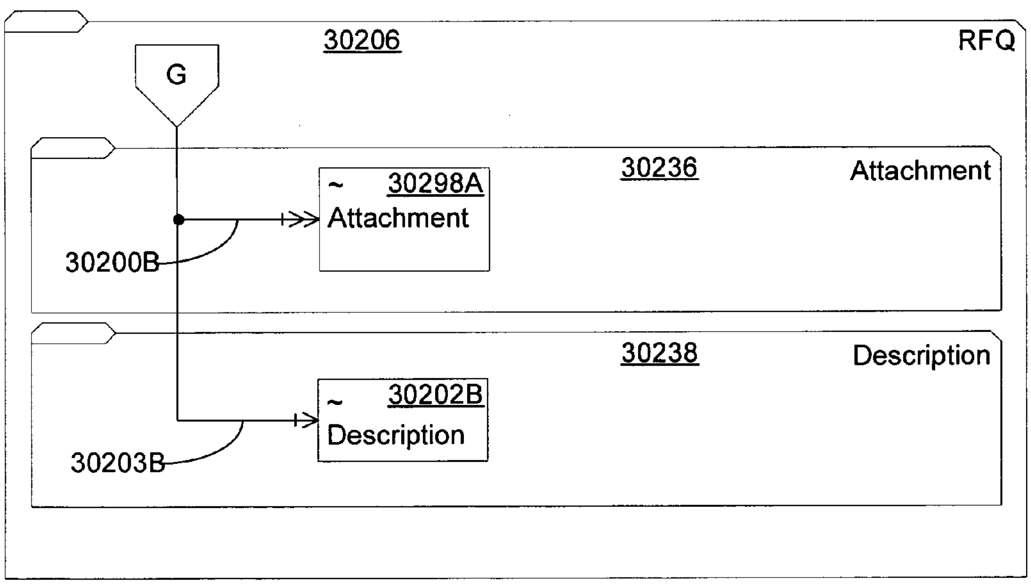
Figure 302H:
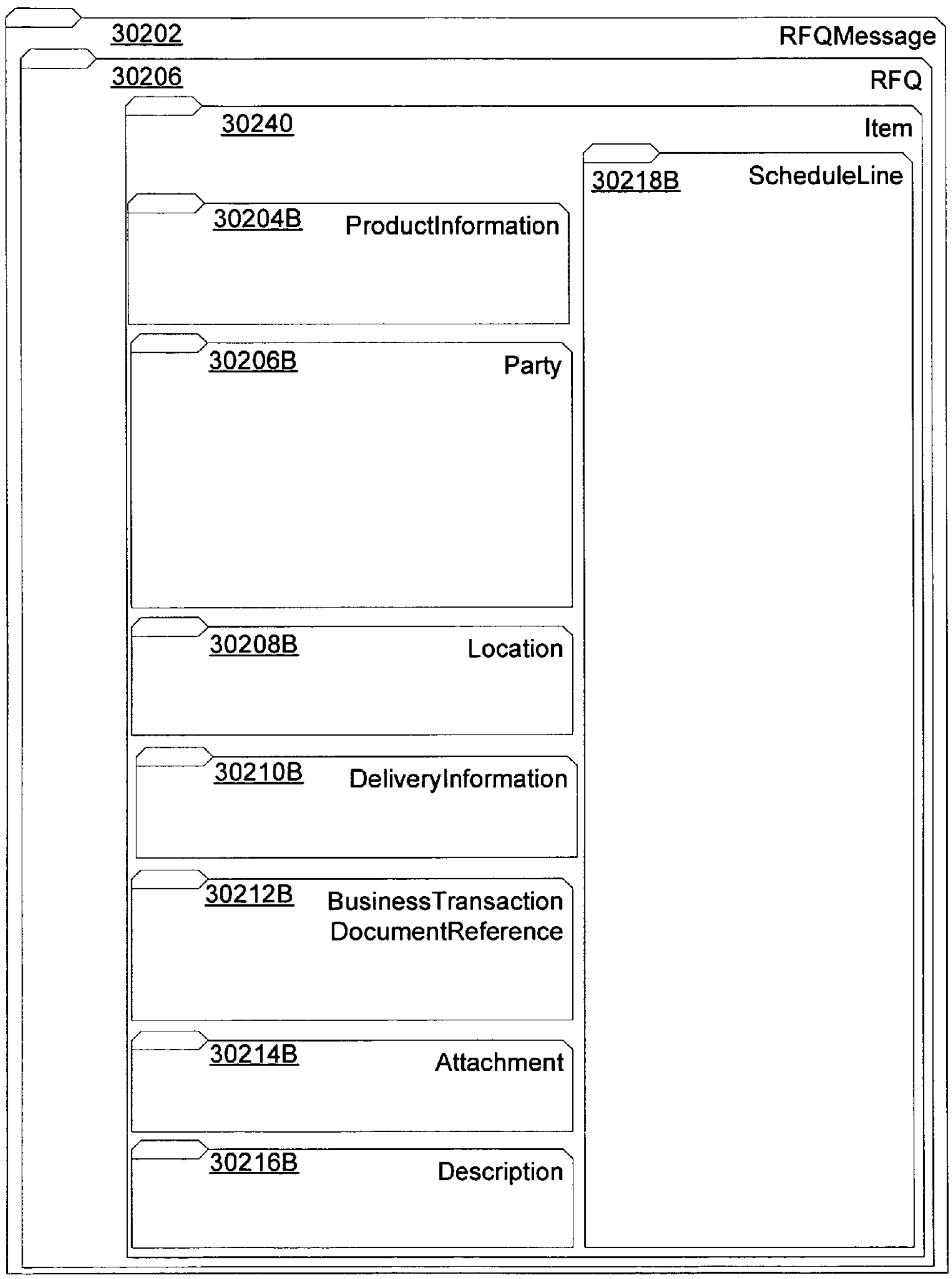
Figure 302I:
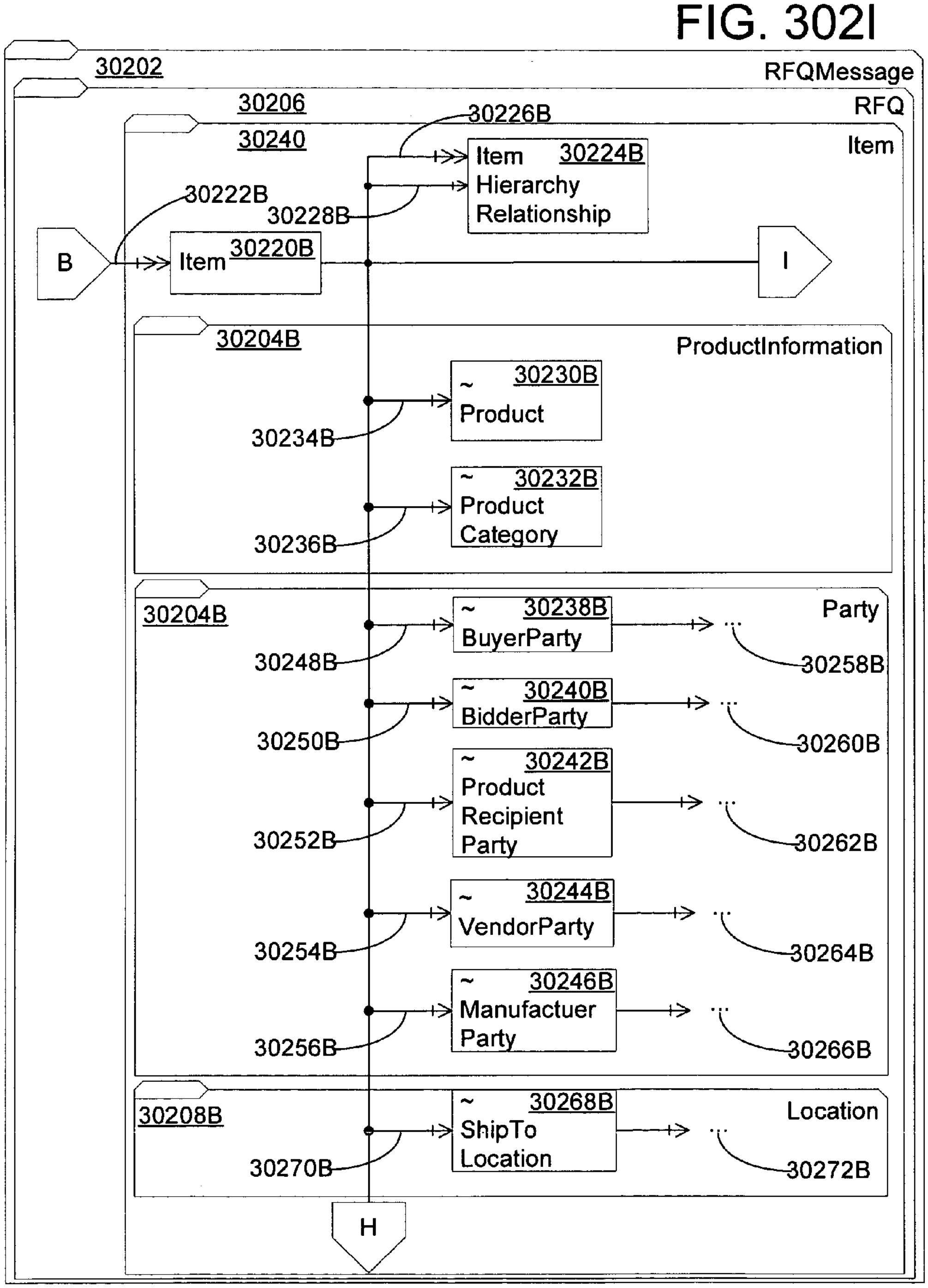
Figure 302J:
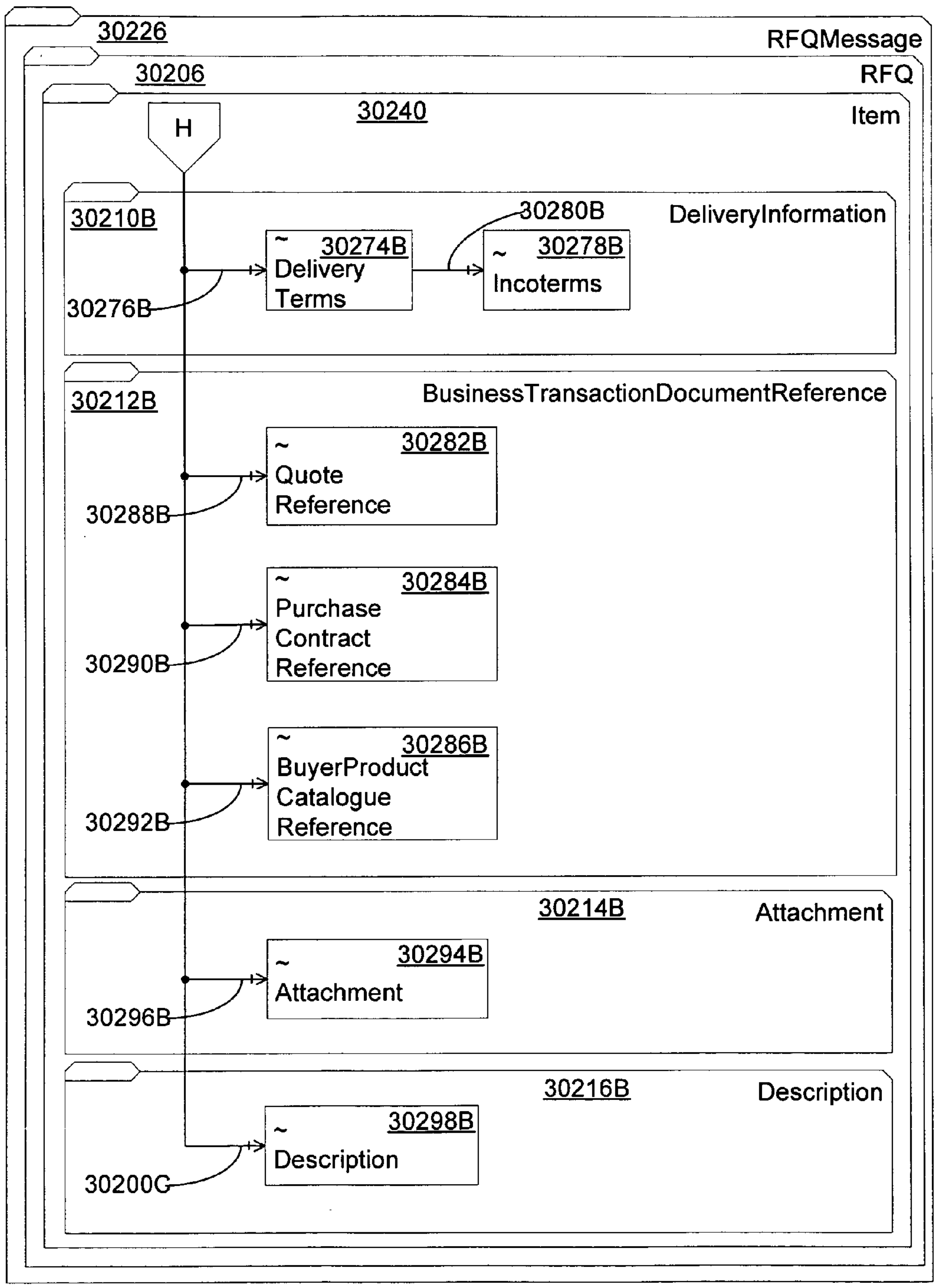
Figure 302K:
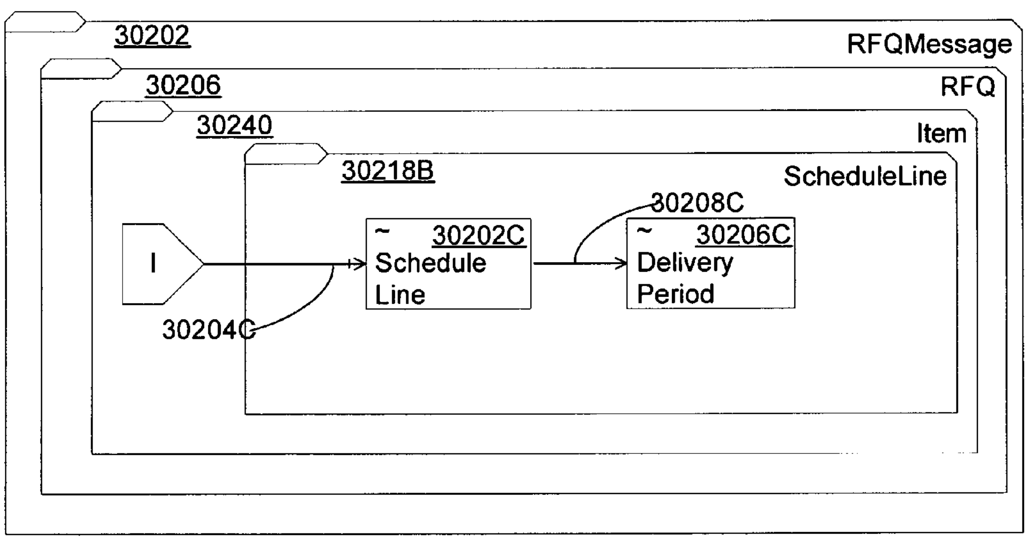

FIG. 301 depicts the message choreography for the RFQ Interfaces. The choreography involves two business entities: a buyer (Purchasing or SRM) 30102 and a bidder (Supplier) 30104. In one implementation, there are five messages that are used to map a B2B RFQ process: (1) RFQRequest; (2) RFQChangeRequest; (3) RFQCancellationRequest; (4) QuoteNotification; and (5) RFQResultNotification. In the implementation shown in FIG. 301, the buyer 30102 sends an RFQRequest message 30106 to the bidder 30104, which is used to start a new RFQ process. In response, the bidder 30104 may send an RFQAcceptanceConfirmation message 30108 to the buyer 30102 to inform the buyer 30102 whether the bidder 30104 intends to submit a quotation. This provides the buyer 30102 with an early indication of whether the bidders that were expected to participate are in fact participating. In the case of a public RFQ process, the bidder 30104 can also use this message to apply to participate and to ask for the RFQ documents to be sent.

The buyer 30102 may send an RFQChangeRequest message 30110 to the bidder 30104, which is used to change an RFQ during an RFQ process. Changing an RFQ includes creating new items, changing existing items, and deleting items. This message is also used when a buyer returns the bidder's quotation for revision.

The buyer 30102 may also send an RFQCancellationRequest message 30112 to the bidder 30104, which is used to cancel an RFQ that is no longer required.

The bidder 30104 may send a QuoteNotification message 30114 to the buyer 30102, which includes the bidder's quotation in response to the buyer's invitation to submit a quotation. The buyer 30102 may send a RFQResultNotification message 30116 to the bidder 30104, which either includes a notification about the RFQ items for which the bidder's quotation has been accepted including the extent of the award or a negative notification if the bidder's quotation was not successful. In response, the bidder 30104 may send an RFQResultAcceptanceConfirmation message 30118 to the buyer 30102 and includes the bidder's acceptance or rejection of the quotation accepted by the buyer 30102. This message may be used particularly if the quotation accepted by the buyer represents a part of the bidder's quotation, since individual items and/or partial quantities in the RFQ are being distributed to several bidders.

The structures of the first five message types to be implemented are specified in the four message data types RFQMessage, RFQCancellationMessage, QuoteMessage, and RFQResultMessage. The structure of the two message types RFQRequest and RFQChangeRequest is specified by the message data type RFQMessage. The parts of the structure that are used differ depending on the message. The description of the RFQMessage below specifies which parts are used in which message.

The structure of the message type RFQCancellationRequest is specified in the message data type RFQCancellationRequest, which has a relatively simple structure. In one implementation, this message type includes the RFQ number. The structure of the message type QuoteNotification is specified in the message data type QuoteMessage. The structure of the message type RFQResultNotification is specified in the message data type RFQResultMessage.

An RFQRequest is a request from a buyer to a bidder to participate in an RFQ process for a product. The structure of the message type RFQRequest is specified in the message data type RFQMessage. The RFQRequest is sent once for each invited bidder. Since the RFQ can be used for contractual negotiations, the structure may also include contract-specific fields. These fields contain information for creating a contract from a successful quotation. The addressee for a message can also be a tendering platform, for example, which means that the actual bidders are not known when the RFQRequest is issued. RFQs issued by public authorities are published with general access. Rather than being invited directly, bidders may apply to participate, via the platform. One aim of the platform may be to avoid giving certain bidders preferential treatment as a result of not inviting or informing, or by implicitly excluding, other bidders.

An RFQChangeRequest is a change to the buyer's request to a bidder to participate in an RFQ process for a product. The structure of the message type RFQChangeRequest is specified in the message data type RFQMessage. The RFQChangeRequest is sent once for each invited bidder in one implementation. This is independent of whether a quotation has already been submitted. In the case of a publication platform (such as a bulletin board), which is used to publish an RFQ, the RFQChangeRequest is sent to the platform and to the bidders who have already submitted a quotation. In the case of a tendering platform, in one implementation, which also manages the quotation process (such as in the public sector), the RFQChangeRequest is sent to the tendering platform. The platform then provides the bidders with information. The scenario that applies depends on the configuration. In one implementation, an RFQChangeRequest can be sent as often as required and at any time, provided that RFQCancellationRequest or RFQResultNotification messages have not been sent. This message can be used to return a quotation from a particular bidder to this bidder for revision. This message asks the bidder in question to revise the quotation and resubmit it, before the buyer can consider it, The RFQChangeRequest is the basis for remaining quotations. Any quotations that have already been submitted are returned to the bidders as a result of this message. Regardless of whether the changes affect the submitted quotation, a quotation is resubmitted in one implementation. The revised quotation might be identical to the quotation that was submitted before the RFQ was changed.

An RFQCancellationRequest is a cancellation of an RFQ for a product by a buyer. The structure of the message type RFQCancellationRequest is specified in the message data type RFQCancellationMessage. The RFQCancellationRequest can be sent at any time up to the submission deadline. After the RFQCancellationRequest has been sent, no further messages are expected. This message is sent to the invited bidders, regardless of whether a quotation already exists. In the case of a tendering platform, the RFQCancellationRequest is sent to the tendering platform and to the bidders who have already submitted a quotation. The RFQCancellationRequest message has its own structure, that is, the structure of the RFQCancellationMessage, with the object ID of the cancelled RFQ.

A QuoteNotification is a quotation submitted by a bidder to a buyer in response to the RFQ for a product issued by the buyer. The structure of the message type QuoteNotification is specified in the message data type QuoteMessage. In one implementation, each invited bidder can submit precisely one quotation. If the bidder wants to make changes to a submitted quotation, the bidder asks the buyer who issued the RFQ to return the quotation for revision. The QuoteNotification can be submitted up to the submission deadline. A quotation can be exchanged between the buyer and the bidder as many times as required, up to the submission deadline. The QuoteNotification message has a separate structure, the QuoteMessage. One reason behind having another structure in addition to the RFQMessage is to encourage bidders to submit quotations on their own initiative, not necessarily in response to an RFQRequest.

An RFQResultNotification is a notification by a buyer to a bidder of the type and extent of the acceptance or rejection of the quotation. The structure of the message type RFQResultNotification is specified in the message data type RFQResultMessage. The RFQResultNotification is sent once for each bidder to the bidders that have submitted a quotation. Successful bidders are sent precise information about the quotation acceptance. Unsuccessful bidders are sent a standard rejection. In the case of a tendering platform, a copy of the RFQResultNotification for the successful bidders can also be sent to the tendering platform so that the result can be published. In the public sector, the decision regarding whose quotation has been accepted is made public.

The interaction between the RFQ interfaces in an RFQ process is described in detail below. Generally, the buyer initiates the RFQ process and invites bidders to submit quotations. Up to the submission deadline, the bidder and buyer exchange quotations, queries, revised quotations, and changes to the RFQ. Once the submission deadline has passed, the buyer compares the quotations and decides to accept the quotation submitted by one particular bidder or several bidders. The buyer can also decide to reject all quotations.

The buyer starts an RFQ process by sending an RFQRequest message. Each invited bidder or addressed public platform receives a separate invitation. Once the RFQ process has been started, the buyer can send change requests at any time, using an RFQChangeRequest message. Quotations that have already been submitted are then resent automatically to the bidder in question. The bidder then resubmits the quotation, in one implementation, before it can be considered by the buyer (even if the RFQChangeRequest does not affect the bidder's quotation).

At any time up to the submission deadline, the buyer can end the RFQ process by sending an RFQCancellationRequest message. If the submission deadline has already passed, the RFQCancellationRequest is no longer used. However, the buyer can decide against all the quotations submitted and therefore reject them. Provided the RFQ has not been set to complete, the buyer can make changes to the RFQ in order to obtain additional quotations or revisions to the submitted quotations by extending the submission deadline. Alternatively, the buyer can create a new RFQ with the same contents or with different contents.

After receiving the RFQRequest message, the bidder can send a quotation to the buyer, using the QuoteNotification message. In one implementation, each invited bidder is allowed to submit one quotation in response to an RFQRequest. To make changes to a submitted QuoteNotification, the bidder asks the buyer who issued the RFQ to return the quotation for revision. The bidder can enter any queries in the quotation and wait for the quotation to be returned, together with a note from the buyer. The quotation can be exchanged any number of times. To withdraw the quotation, the bidder contacts the buyer, who then deletes the quotation.

The buyer can also take the initiative and return a submitted quotation to the bidder, using the RFQChangeRequest, asking for revisions to be made. In this case, the bidder resubmits the quotation for it to be considered in the quotation comparison.

At any time up to the submission deadline, changes and quotations can be exchanged as often as required. However, while the buyer is allowed to send an RFQChangeRequest at any time, or several RFQChangeRequests in succession, an RFQChangeRequest is followed by the QuoteNotification. In one implementation, the QuoteNotification cannot be sent several times in succession.

The quotation process is completed either as a result of the RFQCancellationRequest being sent or the submission deadline passing. Once the submission deadline has passed, the buyer compares the quotations that have been submitted and decides to accept the quotation(s) from one bidder or several bidders. The buyer can also decide to reject all of the submitted quotations. The buyer can split the order quantities as required, up to item level.

In the case of public authority tendering platforms, the steps that stipulate that the buyer is allowed to view the quotations before the submission deadline no longer apply. The quotations are not transferred to the buyer until the opening date of the quotation comparison. Prior to this, the quotations may be kept in encrypted form. In one implementation, the bidder can ask for the quotation to be returned for revision or for it to be deleted because the bidder wants to withdraw it. The result of the RFQ is communicated using the RFQResultNotification message. This message informs the successful bidders which quotation has been accepted and details the specific items and the order quantity involved. Unsuccessful bidders are sent a rejection.

In the RFQ process, messages may be transferred exactly once in order ("EOIO") and serialized using message queues. Each RFQ process may have its own message queue (as opposed to one queue for all RFQ processes) so that one failed message does not block the other RFQ messages in the entire system.

A recipient system may accept every formally correct incoming RFQ message. Business problems are resolved on the buyer side, using an RFQChangeRequest or RFQCancellationRequest message, and on the seller side, using a QuoteNotification message. It is up to the recipient system to distinguish between technical and business errors. Borderline cases may include incorrect ISO codes for currencies, and languages. In order to restart an RFQ process that is corrupt as a result of a failed message, the procurement system provides an option for transferring the current status of the RFQ, together with the associated data, at any time using an RFQChangeRequest message. In order to restart a process following a failed RFQRequest message, the procurement system should be able to restart an RFQ process at any time using an RFQRequest message. The RFQResultNotification has legal implications. Following a failed RFQResultNotification, the procurement system should therefore be able to repeat this message.

(2) Message Data Type RFQ Message

The message data type RFQMessage groups together the business information relevant for sending a business document in a message and the RFQ object in the document. As depicted in FIG. 302, the RFQMessage package 30202 includes a MessageHeader package 30204, an RFQ package 30206 and an RFQMessage entity 30208.

(a) Message Header Package

A MessageHeader package 30208 groups together the business information that is relevant for sending a business document in a message. It includes a MessageHeader entity 30210. There is a 1:1 relationship 30212 between the RFQMessage 30208 and the MessageHeader entity 30210.

A MessageHeader entity 30210 groups the business information from the perspective of the sending application to identify the business document in a message, to provide information about the sender, and to provide any information about the recipient. The MessageHeader entity 30210 includes a SenderParty entity 30214 and a RecipientParty entity 30216. There is a 1:c relationship 30218 between the MessageHeader entity 30210 and the SenderParty entity 30214. There is a 1:cn relationship 30220 between the MessageHeader entity 30210 and the RecipientParty entity 30216. The MessageHeader entity 30210 is of type GDT: BusinessDocumentMessageHeader. The MessageHeader entity 30210 includes an ID, a ReferenceID, and a CreationDateTime.

The MessageID is set by the sending application. With the ReferenceMessageID, reference is made in the current BusinessDocument to a previous BusinessDocument. The ReferenceMessageID should be filled in order to avoid inconsistencies that can arise as a result of sending messages in the pipeline at the same time, e.g., the buyer changes the RFQ and sends the message with the changes (RFQChangeRequest) to the bidders. At the same time, a bidder sends a QuoteNotification. Without the ReferenceMessageID in the message header in the QuoteNotification and in the case of longer transmission times for the messages, it may no longer be possible to determine clearly whether the QuoteNotification sent by the bidder refers to the old RFQ or to the new, changed RFQ.

The SenderParty is the party responsible for sending a business document at business application level. The SenderParty entity 30214 is of type GDT:

BusinessDocumentMessageHeader-Party. The SenderParty entity 30214 can be filled by the sending application to name a contact person for any problems with the message. This is particularly useful if an additional infrastructure (such as a marketplace or a tendering platform) is located between the sender and the recipient. The SenderParty entity 30214 is used to transfer the message and can be ignored by the receiving application. It should be filled by the sender particularly if the participating parties are not transferred with the RFQ package 30206.

The RecipientParty is the party responsible for receiving a business document at business application level. The RecipientParty entity 30216 is of type GDT: BusinessDocumentMessageHeaderParty. The RecipientParty entity 30216 can be filled by the sending application to name a contact person for any problems that occur with the message. This is particularly useful if an additional infrastructure (such as a marketplace or a tendering platform) is located between the sender and the recipient. The RecipientParty entity 30216 is used to transfer the message and can be ignored by the receiving application. It should be filled by the sender particularly if the participating parties are not transferred with the RFQ package 30206.

(i) RFQ Package

The RFQ package 30206 includes a Party package 30222, a Location package 30224, a DeliveryInformation package 30226, a PaymentInformation package 30228, a ProductInformation package 30230, a BusinessTransactionDocumentReference package 30232, a FollowUpBusinessTransactionDocument package 30234, an Attachment package 30236, a Description package 30238, and an Item package 30240. The RFQ package 30206 also includes an RFQ entity 30244. There is a 1:1 relationship 30246 between the RFQMessage entity 30208 and the RFQ entity 30244.

The RFQ entity 30244 is a request (or a change to a request) from a buyer to a bidder to submit a quotation for the products (goods or services) specified in the RFQ. In addition to the buying party and the bidder, additional parties can be involved in the RFQ entity 30244 (see Party package 30222 below). The delivery location can also be specified (see Location package 30224 below). Delivery and payment terms are also agreed upon (see DeliveryInformation package 30226 and PaymentInformation package 30228 below). The RFQ entity 30244 can contain a reference to a Quote if the bidder has a question or if the buyer has changed the RFQ entity 30244 (see BusinessTransactionDocumentReference package 30232 and FollowUpBusinessTransactionDocumentReference package 30234 below). Notes or references to attachments can be specified for the RFQ (see Attachment package 30236 and Description package 30238 below). The RFQ entity 30244 is of type GDT: RFQ.

The RFQ entity 30244 includes an ID, a PostingDateTime, a LastChangeDateTime, a PublishDateTime, a DisplayDateTime, a BiddingStartDateTime, a QuoteSubmissionDateTime, a QuoteOpeningDateTime, a QuoteBindingDateTime, a ContractValidityDateTimePeriod, a Note, an RFQPublicIndicator, a QuoteUnplannedItemPermissionCode, a QuotePriceBiddingConditionCode, a QuoteQuantityBiddingConditionCode, a QuoteItemBiddingConditionCode, and a ContractTargetAmount. The ID is a unique identifier specified by the buyer for the RFQ. The ID is of type GDT: BusinessTransactionDocumentID.

The PostingDateTime is the creation date/time of the RFQ at the buyer. The PostingDateTime is of type GDT: DateTime, as are the following elements in this paragraph. The LastChangeDateTime is the date/time of the last change made to the RFQ by the buyer. The PublishDateTime is the date/time when the RFQ is sent. The DisplayDateTime is the date/time as of which the published RFQ is displayed on a tendering platform. The BiddingStartDateTime is the date/time as of which quotations can be submitted. The QuoteSubmissionDateTime is the date/time after the BiddingStartDateTime up to which quotations can be submitted. The QuoteOpeningDateTime is the date/time when the quotations are opened and displayed for the quotation comparison. The QuoteBindingDateTime is the date/time up to which bidders are bound to the quotations they have submitted.

The ContractValidityDateTimePeriod is the validity period of the contract that is to be assigned using the RFQ. The ContractValidityDateTimePeriod is of type GDT: DateTimePeriod. The Note is a short description or the title of the RFQ. It is generally used to provide the user with a simple method for searching for a particular RFQ. The Note is of type GDT: Note. The RFQPublicIndicator specifies whether the RFQ process is a closed RFQ process with bidders that have been explicitly invited or an open RFQ process in which bidders who have not been explicitly invited can also participate. The RFQPublicIndicator is of type GDT: BusinessTransactionDocumentPublicIndicator. The QuoteUnplannedItemPermissionCode specifies whether the bidder's quotation is allowed to contain own items with alternative quotations. The QuoteUnplannedItemPermissionCode is of type GDT: UnplannedItemPermissionCode. The QuotePriceBiddingConditionCode specifies whether the bidder is allowed to specify pricing information. If the RFQ is used to check the bidder's ability to meet certain technical requirements, for example, prices might not be required. The QuoteQuantityBiddingConditionCode specifies whether the bidder is allowed to enter in the quotation a quantity other than the requested quantity. The QuoteItemBiddingConditionCode specifies whether the bidder has to submit a quotation for all items. The QuotePriceBiddingConditionCode and QuoteItemBiddingConditionCode are of type GDT: BiddingConditionCode. The ContractTargetAmount is the target amount in contractual negotiations. The ContractTargetAmount is of type GDT: Amount.

The ContractTargetAmount in the QuoteNotification is information provided to the buyer by the bidder. The ContractTarget-Amount is used if a contract is to be negotiated and assigned using an RFQ. Differences between the RFQContractTargetAmount and the QuoteContractTargetAmount are allowed and are subject to the business framework of the negotiation process as defined by the buyer and bidder. There are no dependencies between how the ContractTargetAmount is used at header and/or item level. The bidder decides which information to supply to the buyer.

(ii) RFQ Party Package

The Party package 30222 groups together the business parties that occur in one of the RFQ messages. The party package 30222 includes a BuyerParty entity 30248, a BidderParty entity 30250, a BidderPortalProviderParty entity 30252, a ProductRecipientParty entity 30254, a VendorParty entity 30256, a ManufacturerParty entity 30258, and a PayerParty entity 30260. There is a respective 1:c relationship 30262, 30264, 30266, 30268, 30270, 30272, and 30274 between the RFQ entity 30244 and the BuyerParty entity 30248, the BidderParty entity 30250, the BidderPortalProviderParty entity 30252, the ProductRecipientParty entity 30254, the VendorParty entity 30256, the ManufacturerParty entity 30258, and the PayerParty entity 30260.

In one implementation, either the ID or the ID and address can be transferred for each party. If the ID is transferred, the ID address defined in the master data is used. If the ID and address are transferred, the ID identifies the party and the address is deemed to be a document address that is different to the master data address. The ID and address may be sent to avoid misunderstandings. The receiving application may implement a suitable optimization strategy to ensure that the system does not create many identical document addresses.

A default logic is used for the parties: from the header to the items and within item hierarchies. Parties specified in the header are used for the items for which a corresponding party is not explicitly transferred and that are directly assigned to the header. In accordance with the same logic, parties transferred at item level are used for subitems assigned to the relevant item in an item hierarchy. The default logic is used for the party as a whole, including the contact person. In one implementation, parts of a party specified at header level or for a hierarchy item cannot be specified in more detail at item level. The default logic may be a simplified version of the transferred message. As regards logic, parties at header level and for hierarchy items behave as if they have been explicitly transferred for the subitems of the message. This also means that if changed items are transmitted rather than all items, the parties are used for the transmitted items. Changes made to parties also apply to items relevant for the party in question.

A BuyerParty is a party that buys goods or services. The BuyerParty entity 30248 is of type GDT: BusinessTransactionParty. The same BuyerParty entity 30248 is used for all the items in an RFQ in one implementation. The BuyerParty is not changed once an RFQ has been created. Changes can be made to the BuyerParty/Contact entity and a different BuyerParty/Contact entity is permitted for each item. Changes can be made to the address of the BuyerParty, but different addresses are not permitted for each item. If a ProductRecipientParty is not explicitly specified in an RFQ process, the BuyerParty is also used as the ProductRecipientParty. If a ProductRecipientParty and ShipToLocation are not explicitly specified in the RFQ process, the BuyerParty address is also used as the ship-to address. If a PayerParty is not explicitly specified in an RFQ process, the BuyerParty is also used as the PayerParty.

The BuyerParty entity 30248 includes an Address entity 30276 and a Contact entity 30278. There is a 1:c relationship 30280 between the BuyerParty entity 30248 and the Address entity 30276, and there a 1:c relationship 30282 between the BuyerParty entity 30248 and Contact entities 30278. The Address entity 30276 includes a PersonName entity 30284, an Office entity 30286, a PhysicalAddress entity 30288, a GeoCoordinates entity 30290 and a Communication entity 30292. There is a respective 1:c relationship 30294, 30296, 30298, 30200A, and 30202A between the Address entity 30276 and the PersonName entity 30284, the Office entity 30286, the PhysicalAddress entity 30288, the GeoCoordinates entity 30290 and the Communication entity 30292.

The Contact entity 30278 includes an Address entity 30204A. There is a 1:c relationship 30205A between the Contact entity 30278 and the Address entity 30204A. The Address entity 30204A includes a PersonName entity 30206A, an Office entity 30208A, a PhysicalAddress entity 30210A, a GeoCoordinates entity 30212A, and a Communication entity 30214A. There is a respective 1:c relationship 30216A, 30218A, 30220A, 30222A, and 30224A between the Address entity 30204A and the PersonName entity 30206A, the Office entity 30208A, the PhysicalAddress entity 30210A, the GeoCoordinates entity 30212A, and the Communication entity 30214A.

The BidderParty is a party that bids for goods or services. The BidderParty entity 30250 is of type GDT: BusinessTransactionDocumentParty. The same BidderParty entity 30250 may be used for all the items in an RFQ. The BidderParty entity 30250 is not changed once an RFQ has been created. Changes can be made to the BidderParty/Contact entity and a different BidderParty/Contact entity is permitted for each item. Changes can be made to the address of the BidderParty, but different addresses are not permitted for each item. If a VendorParty is not explicitly specified in an RFQ process, the BidderParty is also used as the VendorParty. If a VendorParty and ShipFromLocation are not explicitly specified in an RFQ process, the address of the BidderParty is used as the ship-from address for the material items. The BidderParty entity 30250 includes the same elements as that described above for the BuyerParty entity 30248, as denoted by ellipses 30226A.

A BidderPortalProviderParty is a party that runs a portal that brings business partners together for a business transaction. The BidderPortalProviderParty entity 30252 is of type GDT: BusinessTransactionDocumentParty. The BidderPortalProviderParty entity 30252 is explicitly specified if an RFQ is to be sent to a public tendering platform. The BidderPortalProviderParty entity 30252 includes the same elements as that described above for the BuyerParty entity 30248, as denoted by ellipses 30228A.

The ProductRecipientParty is the party to which goods are delivered or for whom services are provided. The ProductRecipientParty entity 30254 is of type GDT: BusinessTransactionDocumentParty. If a ShipToLocation is not explicitly specified in an RFQ process, the ProductRecipientParty entity 30254 address is used as the ship-to address. The ProductRecipientParty is not synonymous with the ShipToLocation and should be used when the ProductRecipientParty (company or person) is different than the BuyerParty. The ProductRecipientParty entity 30254 includes the same elements as that described above for the BuyerParty entity 30248, as denoted by ellipses 30230A.

A VendorParty is a party that delivers goods or provides services. The VendorParty entity 30256 is of type GDT: BusinessTransactionDocumentParty. If a ShipFromLocation is not explicitly specified in an RFQ process, the address of the VendorParty entity 30256 is used as the ship-from address for the material items. The VendorParty entity 30256 is not the company or person that is responsible for transporting the goods. The CarrierParty entity is responsible for this; however, this party is not typically used in the RFQ interfaces. The VendorParty is not synonymous with the ShipFromLocation and should be used when the VendorParty (company or person) is actually different than the BidderParty. The VendorParty entity 30256 includes the same elements as that described above for the BuyerParty entity 30248, as denoted by ellipses 30232A.

A ManufacturerParty is a party that manufactures goods. The ManufacturerParty entity 30258 is of type GDT: BusinessTransactionDocumentParty. The ManufacturerParty entity 30258 can be used for material items. With regard to the ManufacturerParty entity 30258, the default logic (from header to item to subitems) is used for material items; for other items, the ManufacturerParty entity 30258 is ignored. The ManufacturerParty entity 30258 can be used to uniquely define the context of a ManufacturerProductID entity. The ManufacturerParty entity 30258 includes the same elements as that described above for the BuyerParty entity 30248, as denoted by ellipses 30234A.

A PayerParty is a party that pays for goods or services. The PayerParty entity 30260 is of type GDT: BusinessTransactionDocumentParty. The PayerParty is used for the ContractPayer. The ContractPayer is the party paying for contractual negotiations. The PayerParty entity 30260 includes the same elements as that described above for the BuyerParty entity 30248, as denoted by ellipses 30236A.

(iii) RFQ Location Package

A Location package 30224 groups together the locations that can occur in one of the RFQ messages. The Location package 30224 includes a ShipToLocation entity 30238A. There is a 1:c relationship 30240A between the RFQ entity 30244 and the ShipToLocation entity 30238A. The ShipToLocation entity 30238A includes an Address entity 30242A. There is a 1:c relationship 30244A between the ShipToLocation entity 30238A and the Address entity 30242A.

A similar default logic to that used for Parties is also used for locations. In one implementation, either the ID or the address, or both can be transferred to each location. If the ID is transferred, the ID address defined in the master data is used. If the address is transferred, it is this address that is used (if necessary, a location is assigned at the address recipient). If the ID and address are transferred, the ID identifies the location and the address is deemed to be a document address that is different to the master data address. The ID and address may be sent to avoid misunderstandings. The receiving application should implement a suitable optimization strategy to ensure that the system does not create many identical document addresses.

The ShipToLocation is the location to which goods are to be delivered or where services are to be provided. The ShipToLocation entity 30238A is of type GDT: BusinessTransactionDocumentLocation.

The Address entity 30242A includes a PersonName entity 30246A, an Office entity 30248A, a PhysicalAddress entity 30250A, a GeoCoordinates entity 30252A, and a Communication entity 30254A. There is a respective 1:c relationship 30256A, 30258A, 30260A, 30262A, and 30264A between the Address entity 30242A and the PersonName entity 30246A, the Office entity 30248A, the PhysicalAddress entity 30250A, the GeoCoordinates entity 30252A, and the Communication entity 30254A.

(iv) RFQ Delivery Information Package

A DeliveryInformation package 30226 groups together the information about a required delivery in an RFQ process. The DeliveryInformation package 30226 includes a DeliveryTerms entity 30266A. There is a 1:c relationship 30268A between the RFQ entity 30244 and the DeliveryTerms entity 30266A.

The DeliveryTerms is the condition and agreement that is valid for executing the delivery and transporting the tendered goods and for the necessary services and activities. The DeliveryTerms entity 30266A is type GDT: DeliveryTerms. It includes an Incoterms entity 30270A. There is a 1:c relationship 30272A between the DeliveryTerms entity 30266A and the Incoterms entity 30270A. The Incoterms is allowed to be used for material items. The default logic takes the Incoterms entity into account for material items. For other items, Incoterms may be ignored.

(v) RFQ Payment Information Package

A PaymentInformation package 30228 groups together the payment information in an RFQ process. The PaymentInformation package 30228 includes a CashDiscountTerms entity 30274A and a PaymentForm entity 30276A. There is a 1:c relationship 30278A between the RFQ entity 30244 and the CashDiscountTerms entity 30274A, and a 1:c relationship 30280A between the RFQ entity 30244 and the PaymentForm entity 30276A.

The CashDiscountTerms is the term of payment in an RFQ process. The CashDiscountTerms entity 30274A is type GDT: CashDiscountTerms.

A PaymentForm is the payment form together with the data required. The PaymentForm entity 30276A includes a PaymentFormCode, which is the coded representation of the payment form. The PaymentFormCode is of type GDT: PaymentFormCode.

(vi) RFQ Product Information Package

The ProductInformation package 30230 groups together the product category. The ProductInformation package 30230 includes a ProductCategory entity 30282A. There is a 1:c relationship 30284A between the RFQ entity 30244 and the ProductCategory entity 30282A.

The ProductCategory includes the details about a product category as generally understood from a commercial point of view in business transaction documents. The ProductCategory entity 30282A includes details for identifying the product category using an internal ID, a standard ID, and IDs assigned by involved parties. The ProductCategory entity 30282A is of type GDT: BusinessTransactionDocumentProductCategory. The product category at header level can be used to classify the RFQ and provide the bidders with an initial indication of what is involved in the RFQ. The product category can differ between the buyer and seller.

(vii) RFQ Business Transaction Document Reference Package

The BusinessTransactionDocumentReference package 30232 groups together business document references that can occur in one of the RFQ messages. The BusinessTransactionDocumentReference package 30232 includes a QuoteReference entity 30286A. There is a 1:c relationship 30288A between the RFQ entity 30244 and the QuoteReference entity 30286A.

A QuoteReference is a reference to a quotation. The QuoteReference entity 30286A is of type GDT: BusinessTransactionDocument-Reference.

In one implementation, a QuoteReference can reference one quotation, that is, one ID is permissible. As far as the referenced quotation is concerned, there are no conflicts with a QuoteReference at item level. If a reference is used at both header and item level, it refers to one (the same) quotation.

The reference to a quotation is required at both header and item level, since RFQs do not always have item data. The QuoteReference is used when questions and answers are exchanged between the bidder and buyer and if the RFQ is changed.

(viii) RFQ Follow-Up Business Transaction Document Package

A FollowUpBusinessTransactionDocument package 30234 groups together the information about which business transaction documents the buyer is expecting as a result of the RFQ process. The FollowUpBusinessTransactionDocument entity 30234 includes a FollowUpPurchaseOrder entity 30290A and a FollowUpPurchaseContract entity 30292A. There is a 1:c relationship 30294A between the RFQ entity 30244 and the FollowUpPurchaseOrder entity 30290A, and a 1:c relationship 30296A between the RFQ entity 30244 and the FollowUpPurchaseContract entity 30292A. In the FollowUpBusinessTransactionDocument package 30234, the buyer provides the bidders with information about whether the RFQ is to result in a contract or a purchase order. However, the buyer can also leave this open by not providing any information.

The FollowUpPurchaseOrder provides information about whether the buyer expects a purchase order as a result of the RFQ process. The FollowUpPurchaseOrder entity 30290A includes a RequirementCode, which is a coded representation of information about whether the buyer expects a purchase order as a result of the RFQ process. The RequirementCode is of type GDT: FollowUpBusinessTransactionDocumentRequirementCode. The RequirementCode entity can be changed by the buyer.

The FollowUpPurchaseContract provides information about whether the buyer expects a contract as the result of the RFQ process. The FollowUpPurchaseContract entity 30292A includes a RequirementCode, which is a coded representation of information about whether the buyer expects a contract as a result of the RFQ process. The RequirementCode is of type GDT: FollowUpBusinessTransactionDocumentRequirementCode. The RequirementCode can be changed by the buyer.

(ix) RFQ Attachment Package

The Attachment package 30236 groups together the attachment information regarding the RFQ. The Attachment package 30236 includes an Attachment entity 30298A. The Attachment is any document that refers to the RFQ. The Attachment entity 30298A is of type GDT: Attachment. There is a 1:c relationship 30200B between the RFQ entity 30244 and the Attachment entity 30298A.

(x) RFQ Description Package

The Description package 30238 groups together the texts regarding the RFQ. The Description package 30238 includes a Description entity 30202B. The Description is a natural-language text regarding the RFQ, which is visible to parties. The Description entity 30202B is of type GDT: Description. There is a 1:c relationship 30203B between the RFQ entity 30244 and the Description entity 30202B.

The Description can be used for textual information about the transferred RFQ and not just the current message. An example of this would be information stating that the employee responsible in Purchasing will be on vacation as of a specific date, and indicating the name and telephone number of a substitute as of this date. The Description can also be used for communication between the buyer and bidder in order to process queries, for example. In the case of a public tendering platform, measures are taken to ensure that individual communications with individual bidders, which contain explanatory information about the RFQ, are also made available to other RFQ participants. This is ensured by sending a copy of the description to the tendering platform, where it is published.

(xi) RFQ Item Package

An RFQItem package 30240 includes a ProductInformation package 30204B, a Party package 30206B, a Location package 30208B, a DeliveryInformation package 302101B, a BusinessTransactionDocumentReference package 30212B, an Attachment package 30214B, a Description package 30216B, and a ScheduleLine package 30218B. The Item package 30240 also includes an RFQItem entity 30220B. There is a 1:cn relationship 30222B between the RFQ entity 30244 and the RFQItem entity 30220B. RFQItem entities are arranged hierarchically using a Hierarchy Relationship 30224B. The Hierarchy Relationship 30224B is the relationship between a sub-item and a higher-level parent item in an item hierarchy. There is a 1:cn relationship 30226B between the RFQItem entity 30220B and its subordinate entities, and there is a 1:c relationship 30228B between the RFQItem entity 30220B and its superordinate entities.

The RFQItem specifies a product tendered by an RFQ with additional information on such a product. The RFQItem entity 30220B includes detailed information about a particular product (see ProductInformation package 30204B). The quantity of the product and (delivery) dates/times are specified in the schedule line. For the RFQItem (compared to the information of the RFQ), deviating parties, locations, and delivery terms can be defined (see Party package 30206B, Location package 30208B, and DeliveryInformation package 30210B). The RFQItem can contain references to other business documents that are relevant for the item (see BusinessTransactionDocumentReference package 30212B). Notes or references to attachments can also be specified for the RFQItem (see Attachment package 30214B and Description package 30216B). The RFQItem entity 30220B is of type GDT: RFQItem.

The RFQItem entity 30220B includes an ID and a ContractTargetAmount. The ID is a unique identifier specified by the buyer for an item within an RFQ. The ID is of type GDT: BusinessTransactionDocumentItemID. The ContractTargetAmount is the target amount in contractual negotiations. The ContractTargetAmount is of type GDT: Amount.

A HierarchyRelationship 30224B includes a ParentItemBuyerID, a ParentItemVendorID, and a TypeCode. The ParentItemBuyerID is the reference to a parent item with the item number assigned by the buyer. The ParentItemBuyerID is of type GDT: BusinessTransactionDocumentItemID. The ParentItemVendorID is the reference to a parent item with the item number assigned by the seller. The ParentItemVendorID is of type GDT: BusinessTransactionDocumentItemID. The TypeCode represents the hierarchical relationship between the subitem and its higher-level parent item. The TypeCode is of type GDT: BusinessTransactionDocumentItemHierarchyRelationshipTypeCode. The ParentItemBuyerID, ParentItemVendorID and TypeCode are generally not changed once an item has been created. Either the ParentItemBuyerID or the ParentItemVendorID is specified.

(a) RFQ Item Product Information Package

A ProductInformation package 30204B groups together the product and the product category. The ProductInformation package 30204B includes a Product entity 30230B and a ProductCategory entity 30232B. There is a 1:c relationship 30234B between the Item entity 30220B and the Product entity 30230B, and a 1:c relationship 30236B between the Item entity 30220B and the ProductCategory entity 30232B.

A Product includes the details about a product as generally understood from a commercial point of view in business documents. These are the details for identifying a product and product type, and the description of the product. The Product entity 30230B is of type GDT: BusinessTransactionDocumentProduct.

A ProductCategory includes the details about a product category as generally understood from a commercial point of view in business transaction documents. The ProductCategory entity 30232B includes details for identifying the product category using an internal ID, a standard ID, and IDs assigned by involved parties. The ProductCategory entity 30232B is of type GDT: BusinessTransaction-DocumentProductCategory. The product category is derived directly from the product if a product number is specified for the product. It can differ for the buyer and seller if they have classified the same product differently. This is allowed and should be tolerated by the systems involved. The product category at item level can differ from the product category at header level.

(b) RFQ Item Party Package

The Party package 30206B groups together the business parties that can occur in one of the RFQ messages at the item level and represents part of the Party package 30222 at the header level. The party package 30206B includes a BuyerParty entity 30238B, a BidderParty entity 30240B, a ProductRecipientParty entity 30242B, a VendorParty entity 30244B, and a ManufacturerParty entity 30246B. There is a respective 1:c relationship 30248B, 30250B, 30252B, 30254B, and 30256B between the Item entity 30220B and the BuyerParty entity 30238B, the BidderParty entity 30240B, the ProductRecipientParty entity 30242B, the VendorParty entity 30244B, and the ManufacturerParty entity 30246B. Each of the BuyerParty entity 30238B, the BidderParty entity 30240B, the ProductRecipientParty entity 30242B, the VendorParty entity 30244B, and the ManufacturerParty entity 30246B includes the same elements as that described above for the BuyerParty entity 30248 as denoted by ellipses 30258B, 30260B, 30262B, 30264B, and 30266B.

(c) RFQ Item Location Package

Similar to the Location package 30224 at the header level, the Location package 30208B at the item level includes a ShipToLocation entity 30268B. There is a 1:c relationship 30270B between the Item entity 30220B and the ShipToLocation entity 30268B. The ShipToLocation entity 30268B includes the same elements as that described above for the ShipToLocation entity 30238A as denoted by ellipses 30272B.

(d) RFQ Item Delivery Information Package

Similar to the DeliveryInformation package 30226 at the header level, the DeliveryTerms package 30210B at the item level includes a DeliveryTerms entity 30274B. There is a 1:c relationship 30276B between the Item entity 30220B and the DeliveryTerms entity 30274B. The DeliveryTerms contains a MaximumLeadTimeDuration, which is the maximum lead time from the time of the order to the receipt of the delivery. This duration can be agreed in RFQs or contractual negotiations and represents the basis (that is binding) for the calculation of the received delivery date for an order date. The MaximumLeadTimeDuration is of type GDT: Duration.

The DeliveryTerms entity 30274B includes an Incoterms entity 30278B. There is a 1:c relationship 30280B between the DeliveryTerms entity 30274B and the Incoterms entity 30278B.

(e) RFQ Item Business Transaction Document Reference Package

The BusinessTransactionDocumentReference package 30212B groups together the business document references that can occur in one of the RFQ messages. The BusinessTransaction-DocumentReference package 30212B includes a QuoteReference entity 30282B, a PurchaseContractReference entity 30284B, and a BuyerProductCatalogueReference entity 30286B. There is a respective 1:c relationship 30288B, 30290B, and 30292B between the Item entity 30220B and the QuoteReference entity 30282B, the PurchaseContractReference entity 30284B, and the BuyerProductCatalogueReference entity 30286B.

A QuoteReference is a reference to the quotation or the item within the quotation. The QuoteReference entity 30282B is of type GDT: BusinessTransactionDocumentReference. In one implementation, a QuoteReference entity 30282B can reference one item, that is, one ItemID is permissible. As far as the referenced quotation is concerned, there are no conflicts with a QuoteReference entity 30286A at the header level. If a quotation reference is maintained at both the header and item levels, it refers to one (the same) quotation.

The PurchaseContractReference is a reference to a purchase contract or item in a purchase contract. The PurchaseContractReference entity 30284B is of type GDT: BusinessTransaction-DocumentReference. In one implementation, a PurchaseContractReference entity 30284B can reference one item, that is, one ItemID is permissible. Unless otherwise agreed, the seller is responsible for determining the correct PurchaseContractReference for a specified SellerContractReference.

A BuyerProductCatalogueReference is a reference to the buyer's product catalog or an item within the buyer's product catalog. The BuyerProductCatalogueReference entity 30286B is of type GDT: CatalogueReference. In one implementation, a BuyerProductCatalogueReference entity 30286B can reference one item, that is, one ItemID is permissible. The BuyerProductCatalogueReference entity 30286B should be filled if an RFQItem entity 30220B refers to a catalog whose number and item numbers were assigned by the buyer. In the RFQ process, the BuyerProductCatalogueReference entity 30286B can be used as a substitute product number if the product is defined in a catalog rather than having its own master record.

(f) RFQ Item Attachment Package

The RFQItemAttachment package 30214B includes an Attachment entity 30294B. There is a 1:c relationship 30296B between the Item entity 30220B and the Attachment entity 30294B.

(g) RFQ Item Description Package

The RFQItemDescription package 30216B includes a Description entity 30298B. There is a 1:c relationship 30200C between the Item entity 30220B and the Description entity 30298B.

(h) RFQ Item Schedule Line Package

The ScheduleLine package 30218B groups together the quantity and date information about an RFQItem. The ScheduleLine package 30218B includes a ScheduleLine entity 30202C. There is a 1:c relationship 30204C between the Item entity 30220B and the ScheduleLine entity 30202C.

A ScheduleLine is a line containing the quantity and date of the performance schedule requested by the buyer in an RFQ. The ScheduleLine entity 30202C is of type GDT: RFQItemScheduleLine. The ScheduleLine entity 30202C includes a DeliveryPeriod entity 30206C. There is a 1:1 relationship 30208C between the ScheduleLine entity 30202C and the DeliveryPeriod entity 30206C.

The ScheduleLine entity 30202C includes an ID, a DeliveryPeriod, and a Quantity. The ID is the ScheduleLine number assigned by the procurement system. The ID is of type GDT: BusinessTransactionDocumentItemScheduleLineID. The DeliveryPeriod is the period in which the buyer expects a product to be delivered or service provided. The DeliveryPeriod is of type GDT: DateTimePeriod. The Quantity is the RFQ quantity or the target quantity in contractual negotiations. The Quantity is of type GDT: Quantity.

In one implementation, one ScheduleLine is allowed for each RFQ item. When used more than once, the information in the ScheduleLine and DeliveryInformation is consistent (for example, if used twice, the delivery date is identical in both cases). The ID is optional; a procurement system does not have to number the ScheduleLine entities.

(3) Message Data Type RFQ Cancellation Message

Figure 303:
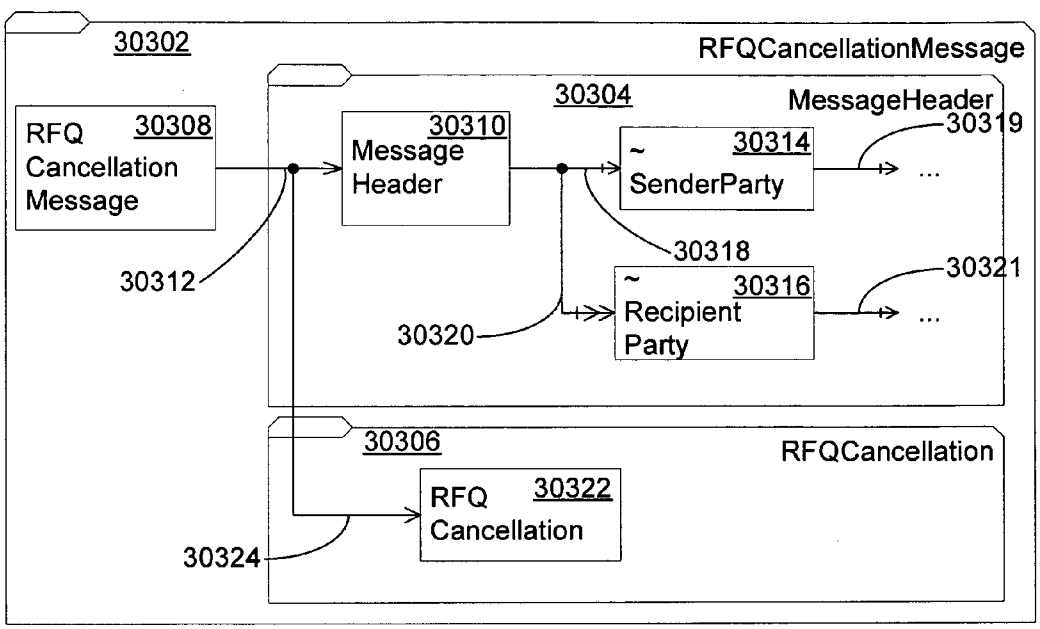
FIG. 303 depicts the data model for the RFQ Cancellation interfaces in accordance with methods and systems consistent with the present invention.
Figure 304A:
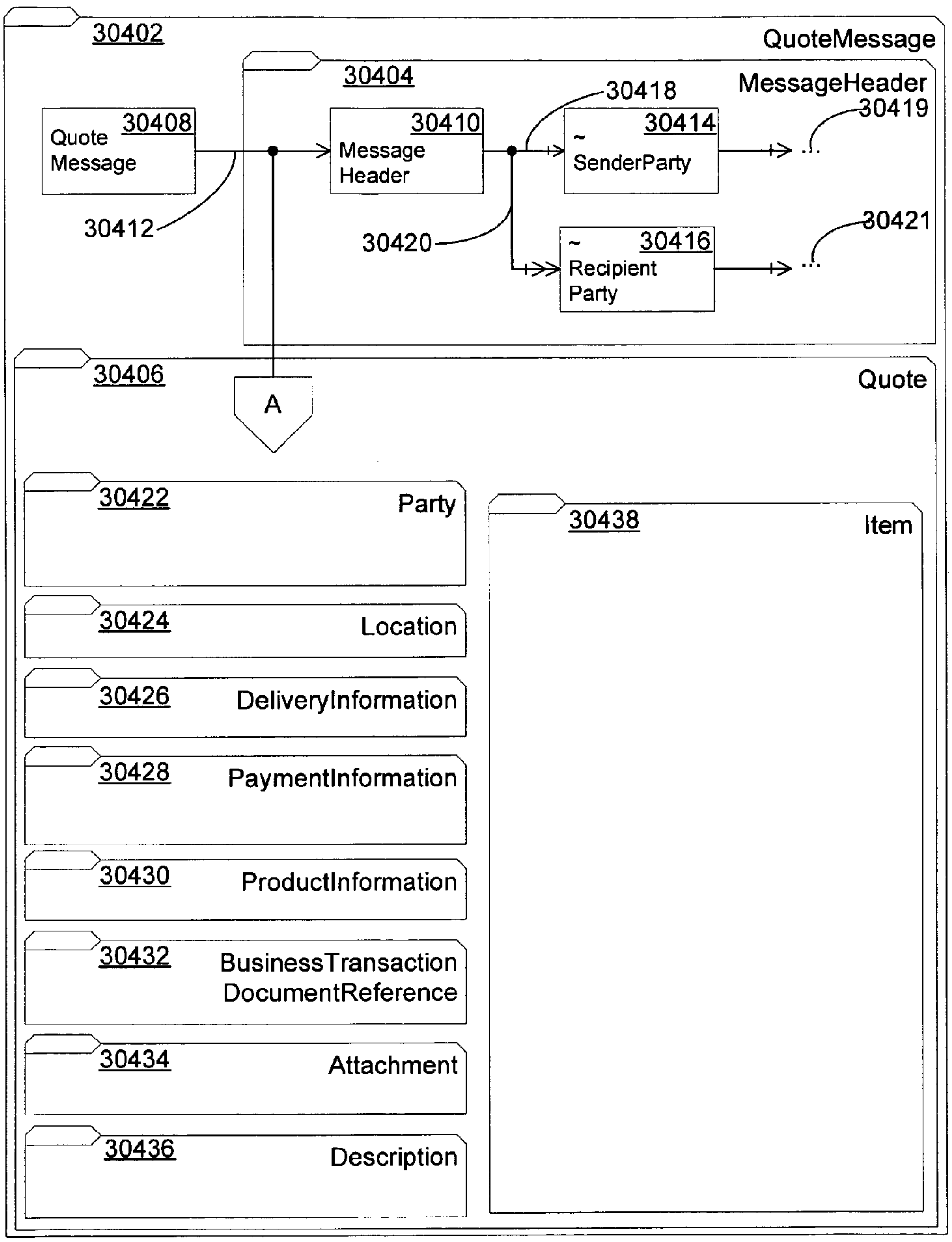
FIGS. 304A-J depict the data model for the Quote interfaces in accordance with methods and systems consistent with the present invention.
Figure 304B:
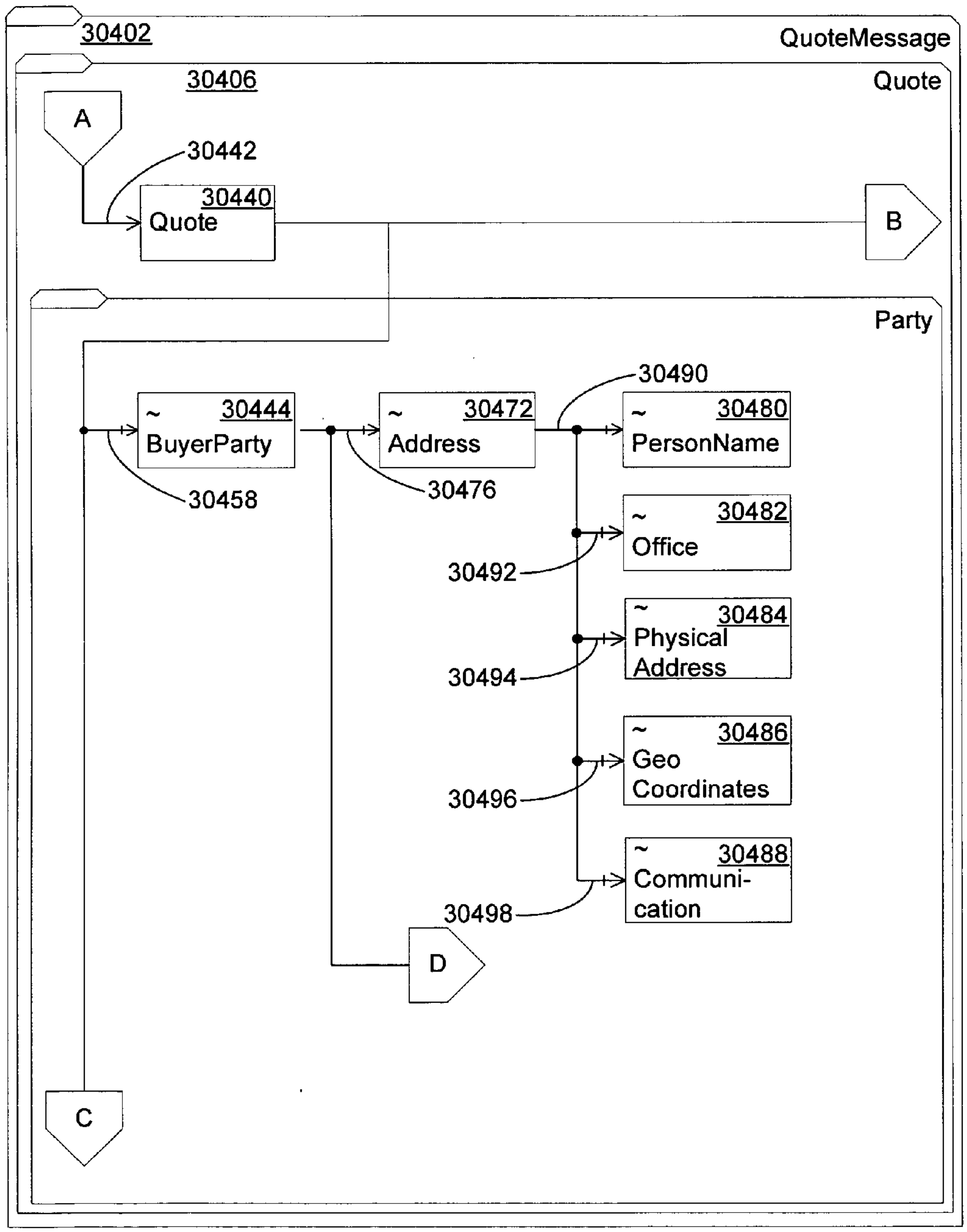
Figure 304C:
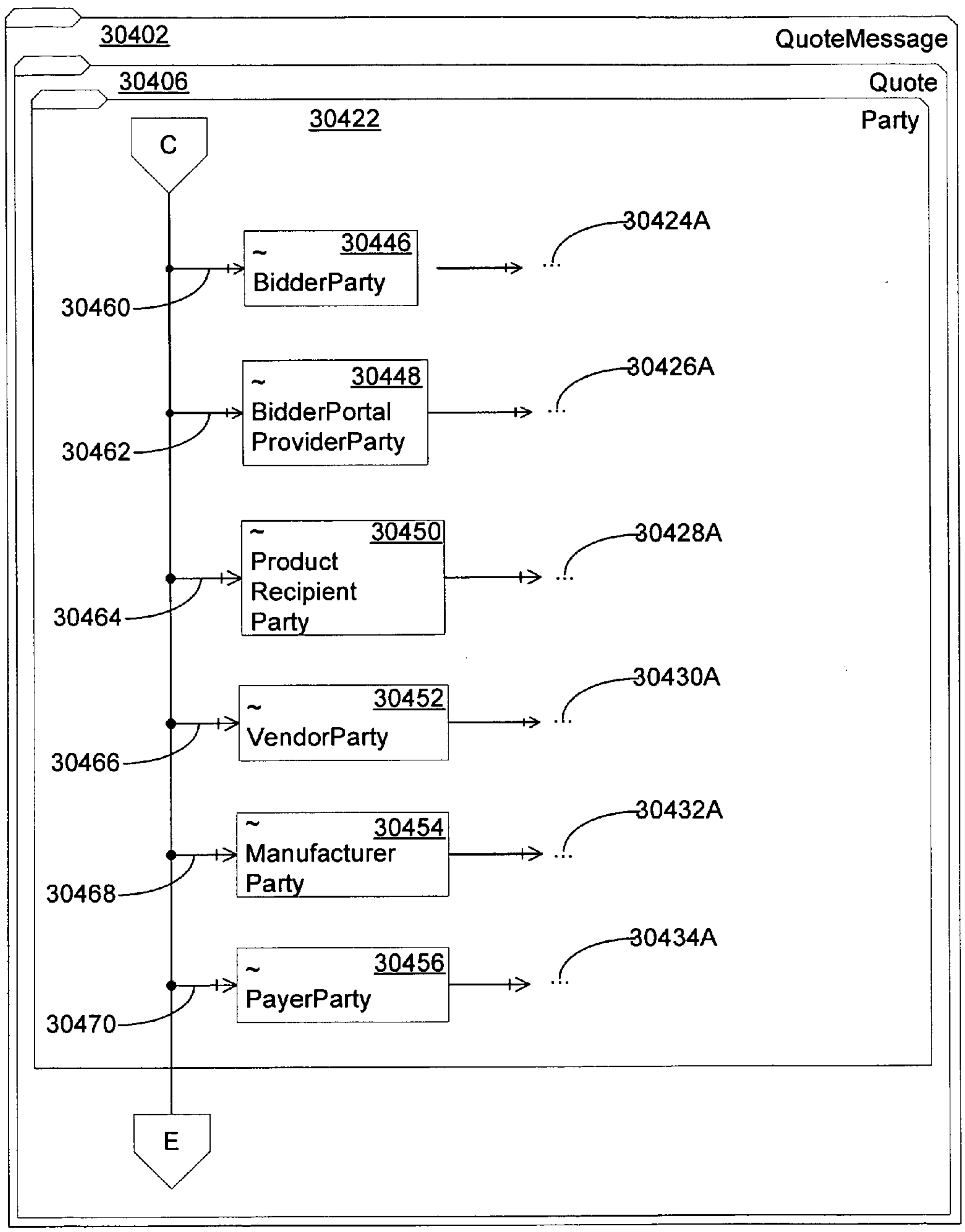
Figure 304D:
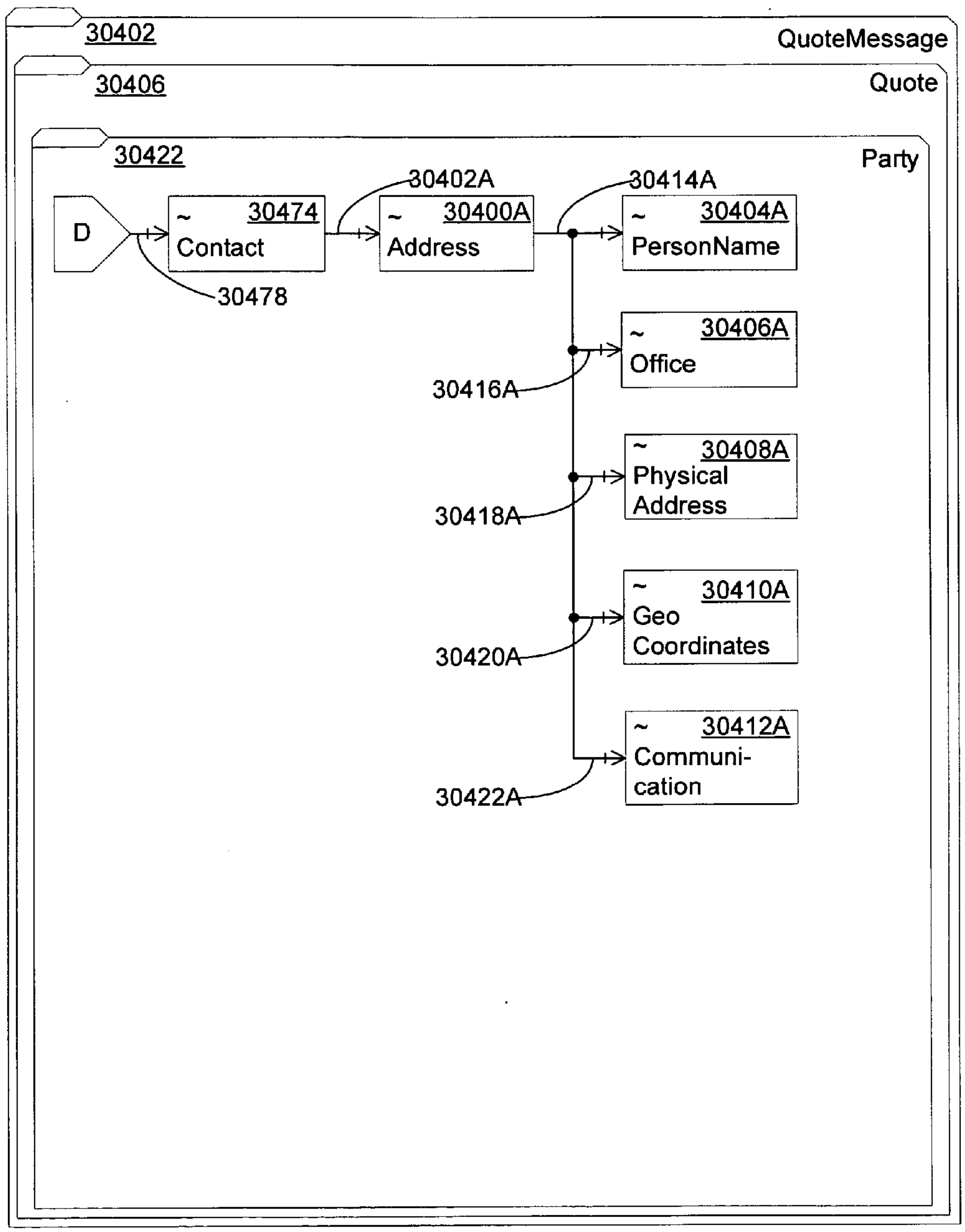
Figure 304E:
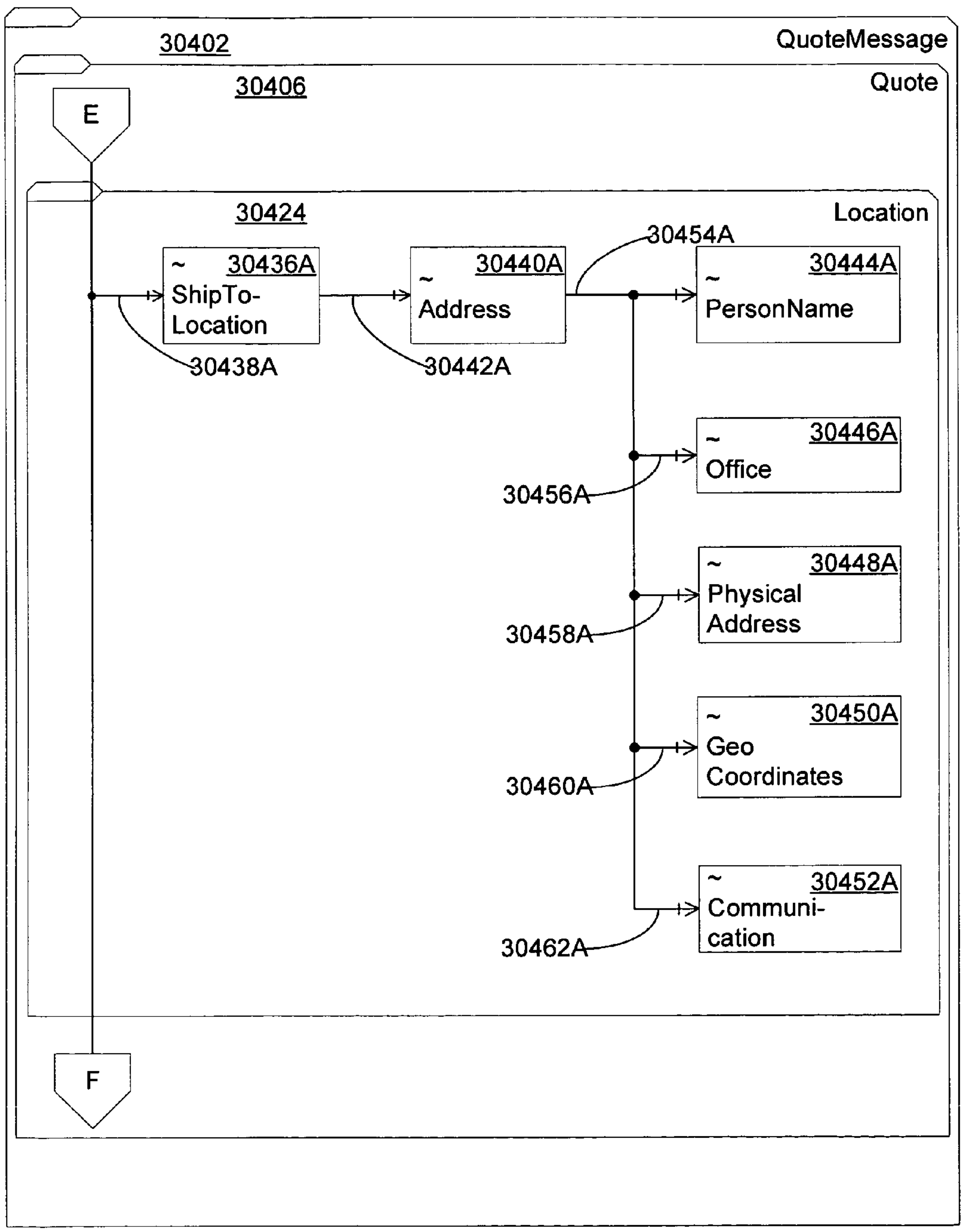
Figure 304F:
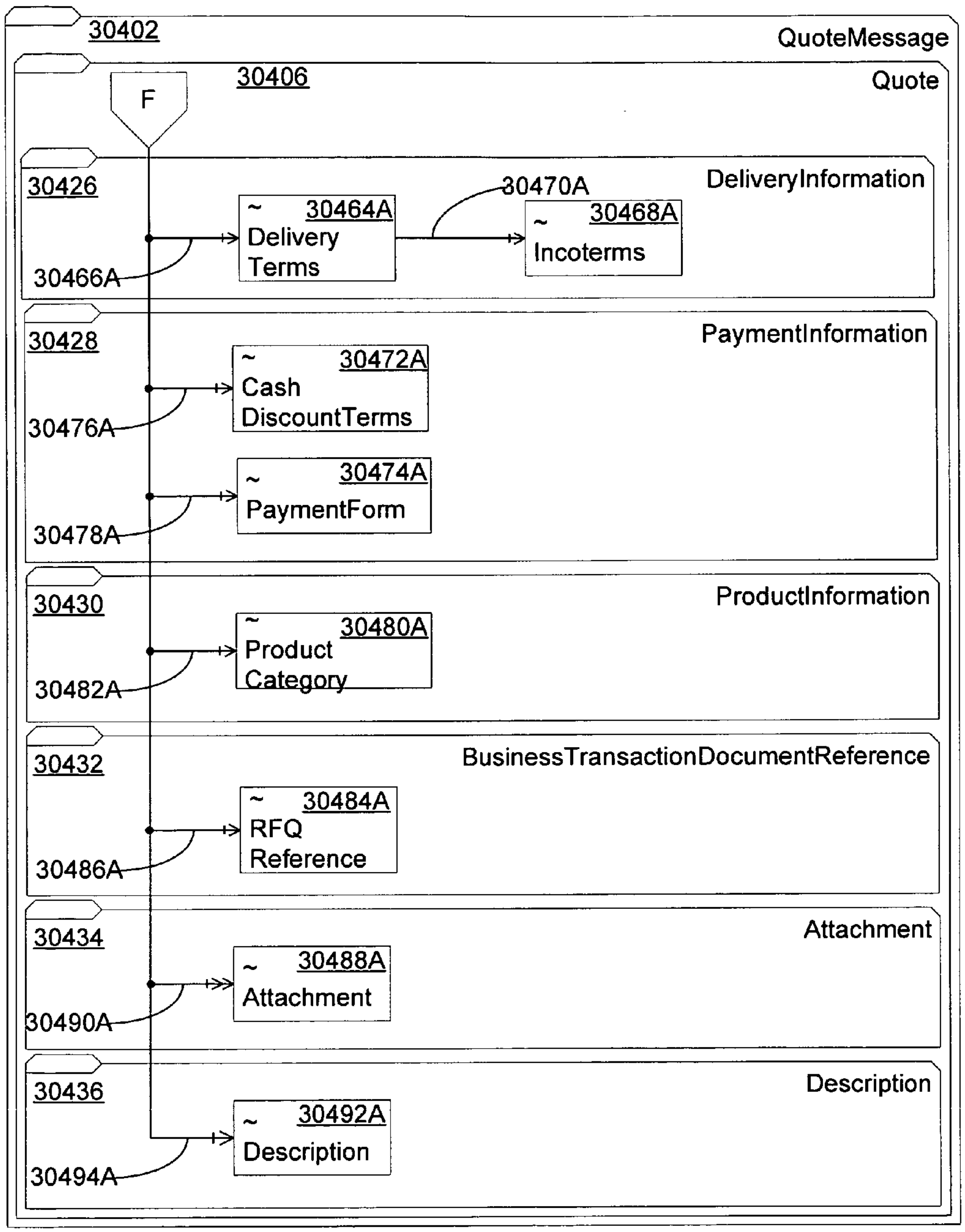
Figure 304G:
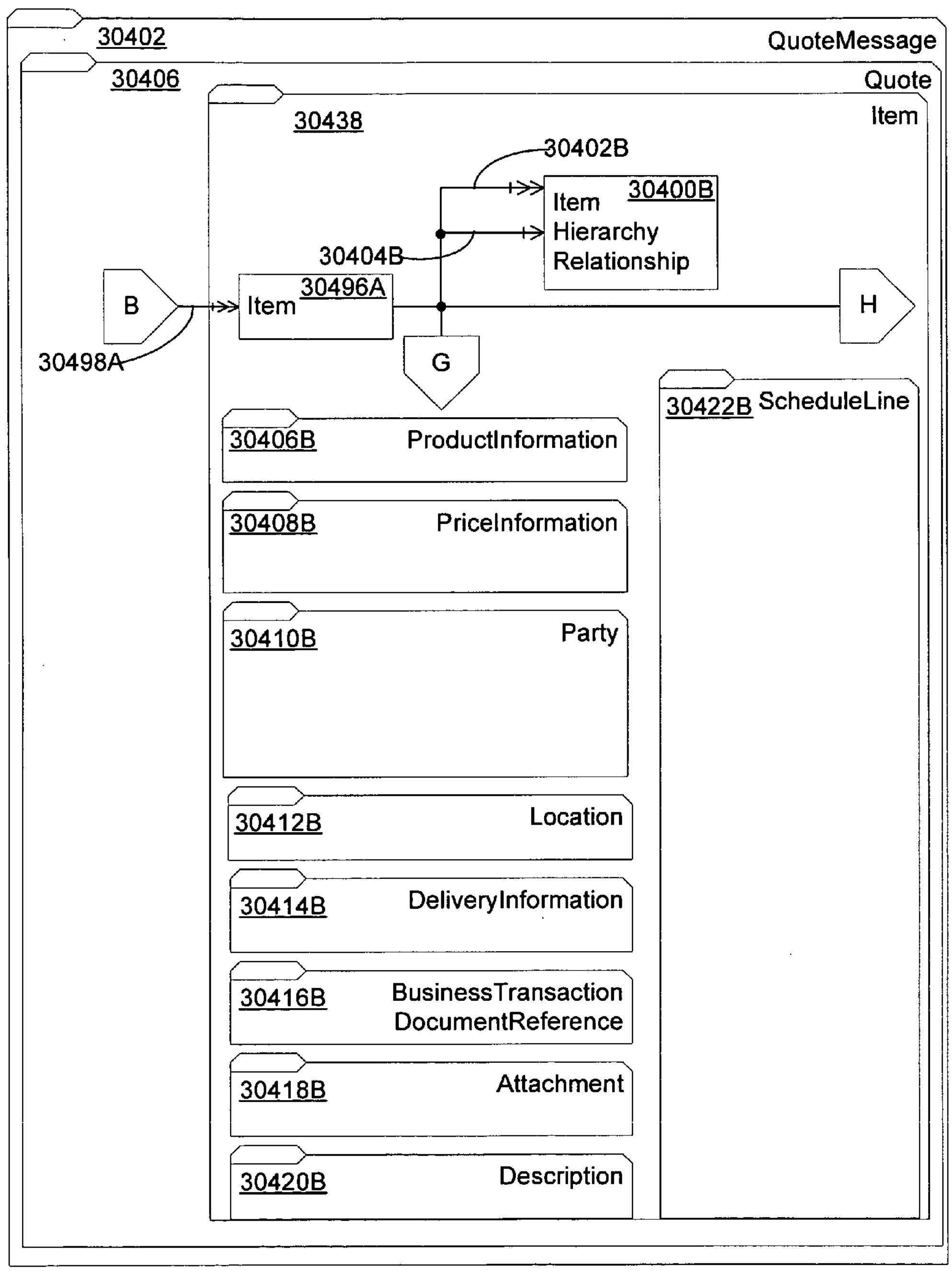
Figure 304H:
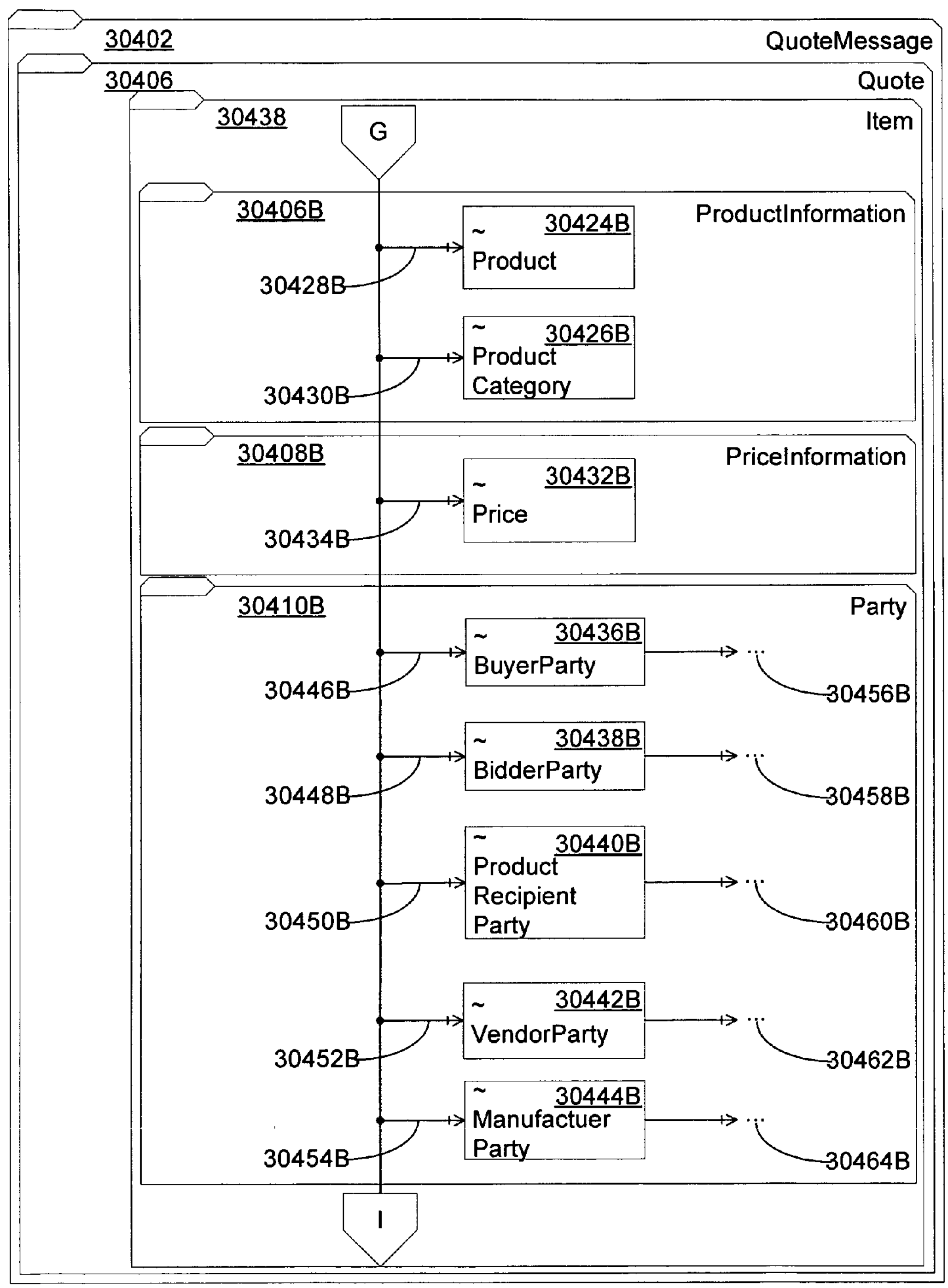
Figure 304I:
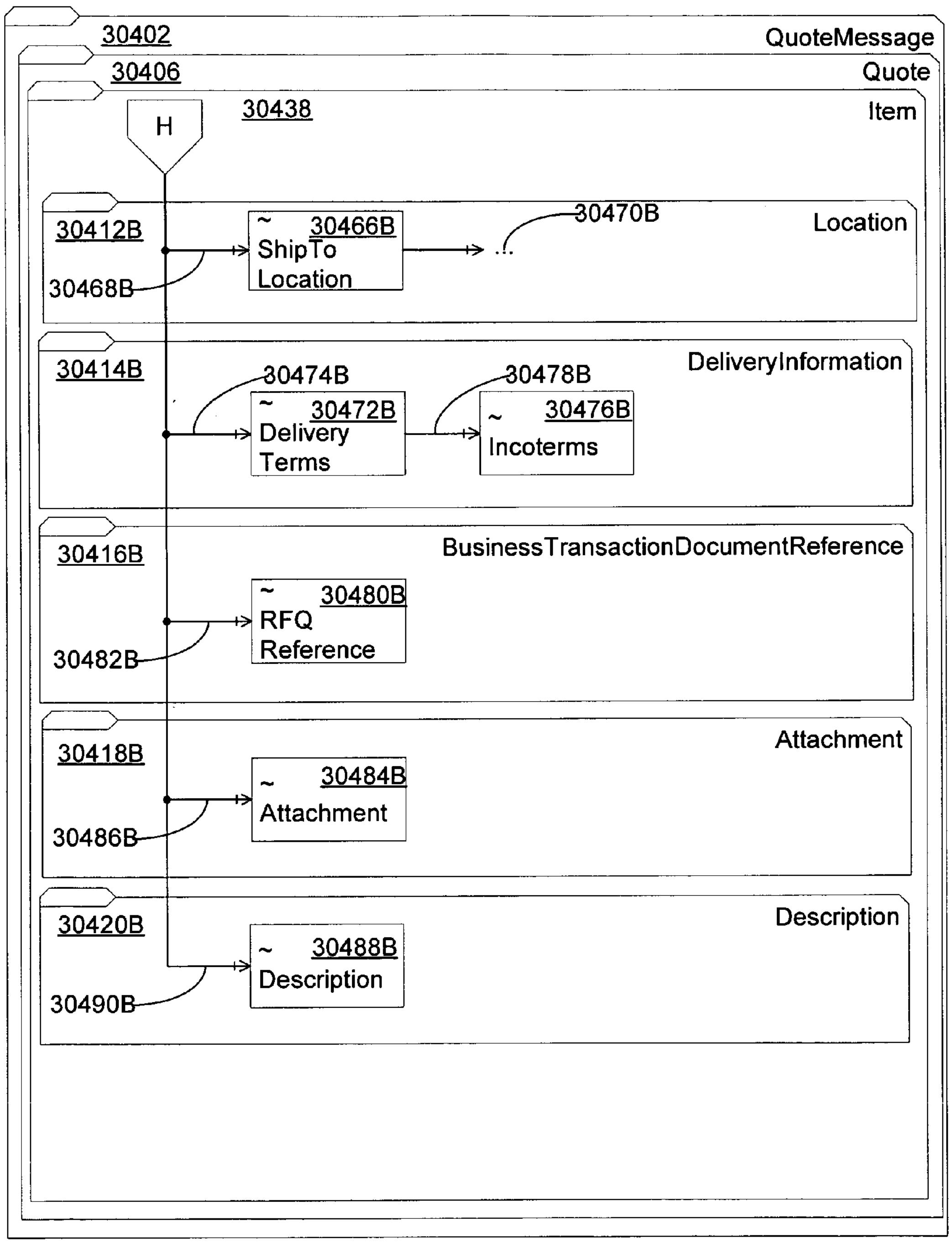
Figure 304J:
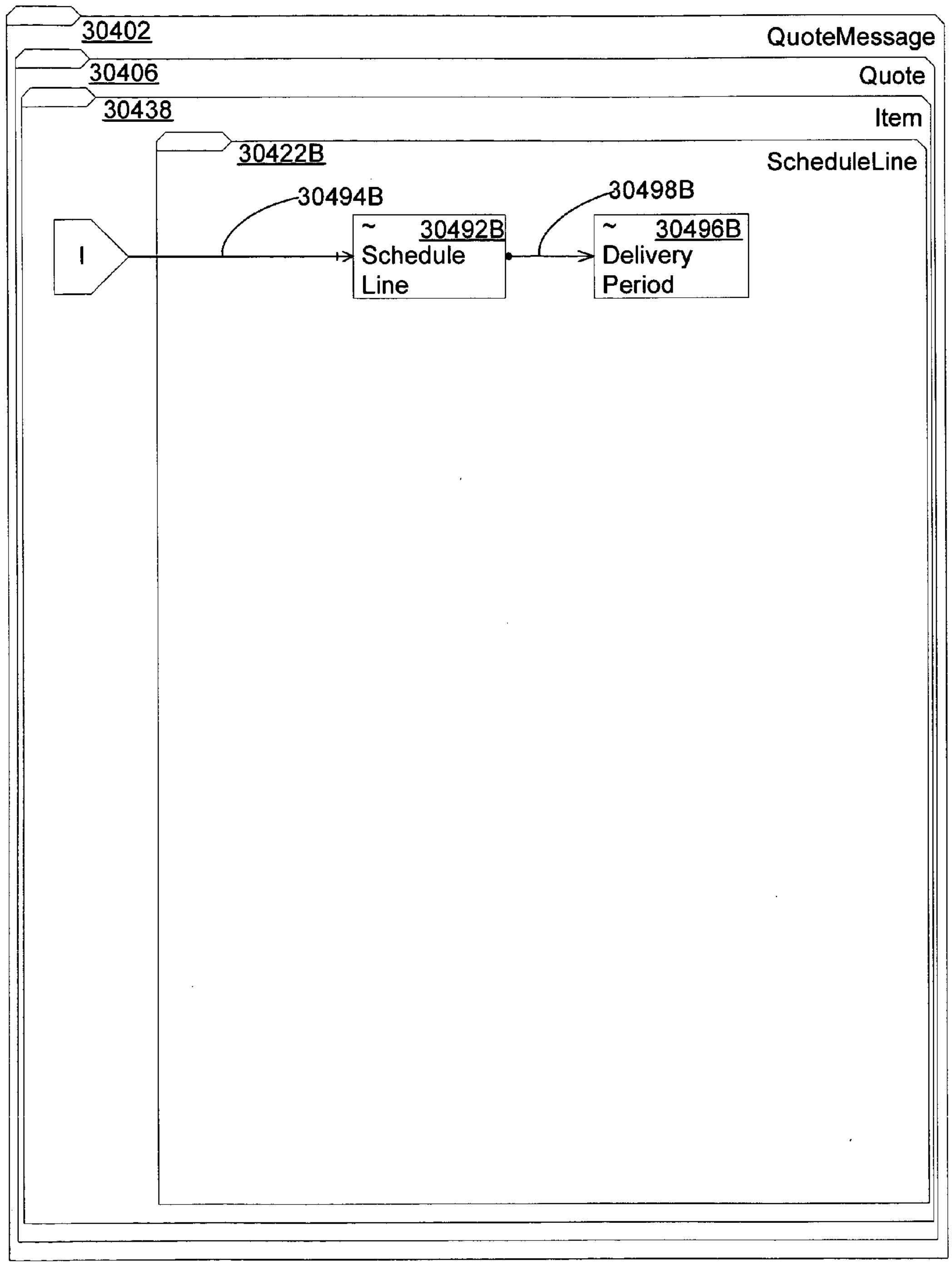
Figure 305A:
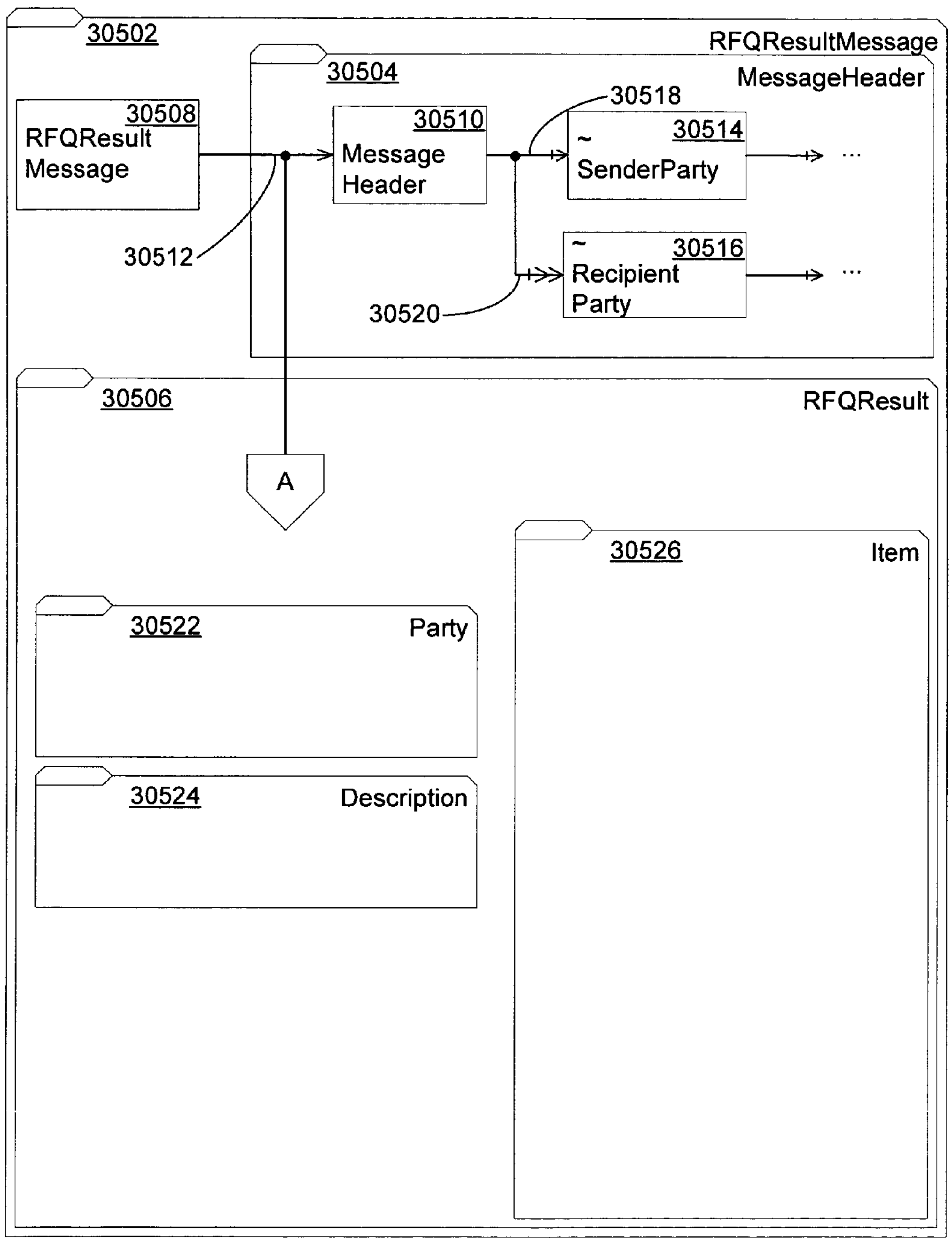
FIGS. 305A-D depict the data model for the RFQ Result interfaces in accordance with methods and systems consistent with the present invention.
Figure 305B:
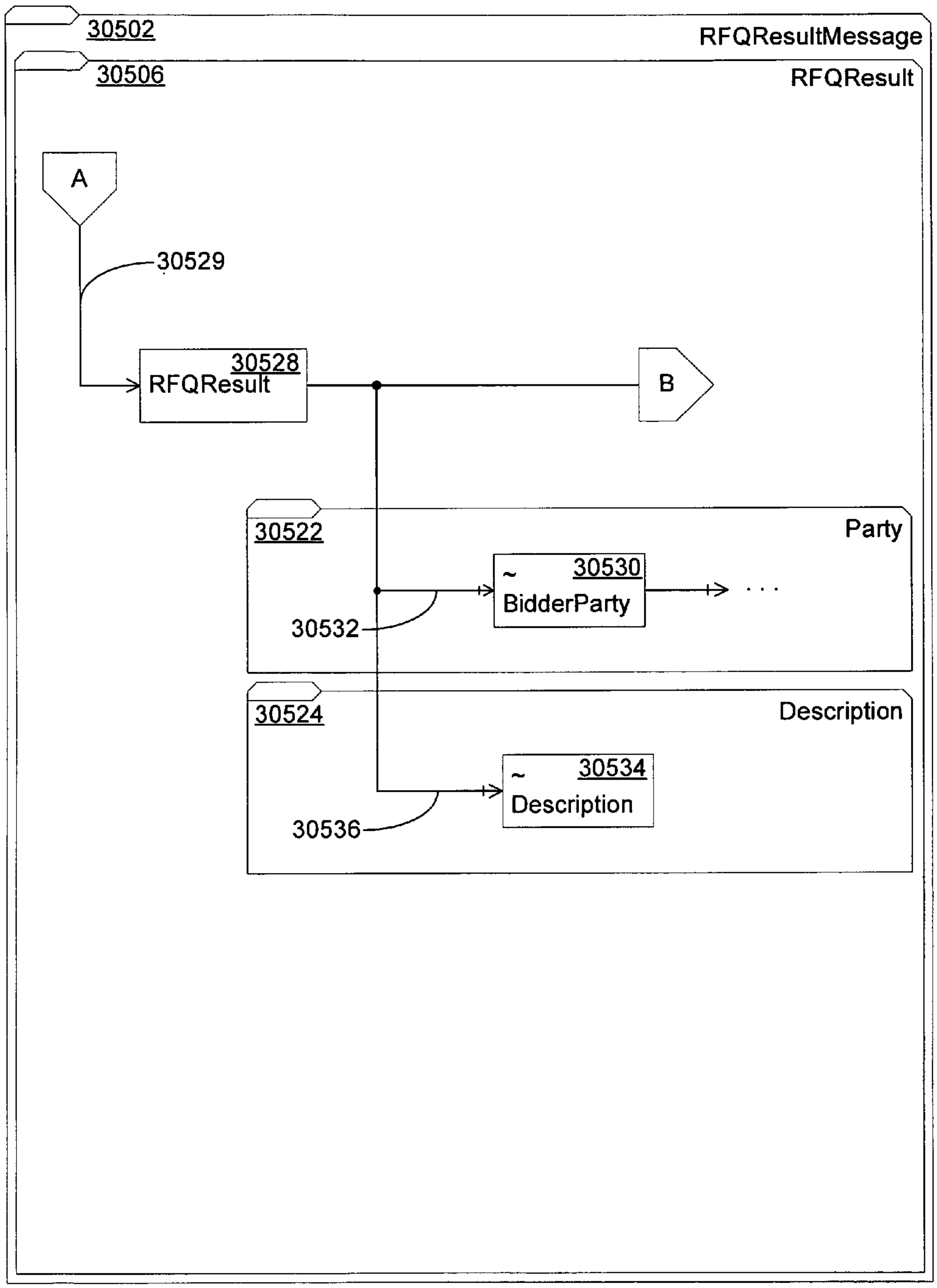
Figure 305C:
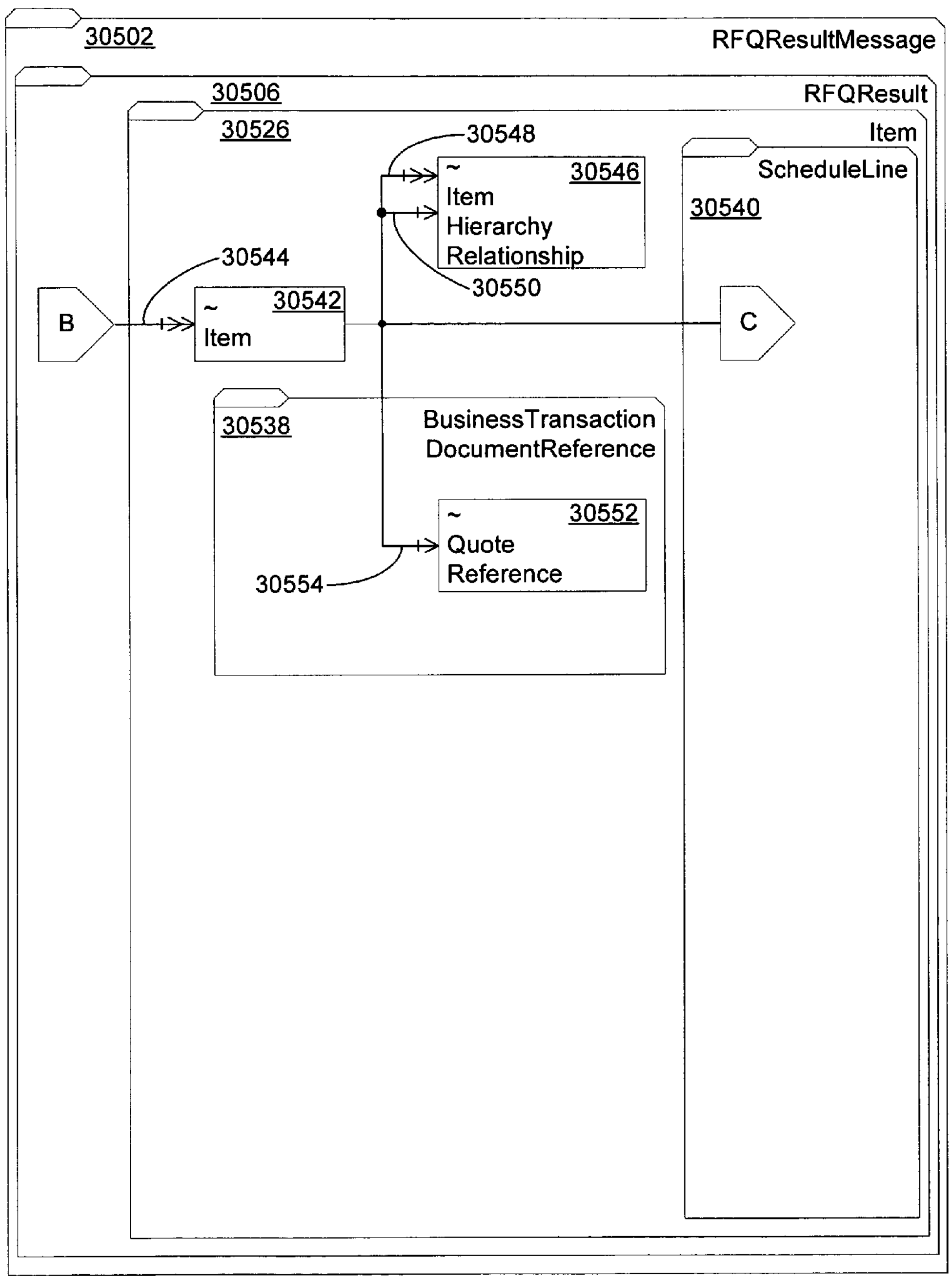
Figure 305D:
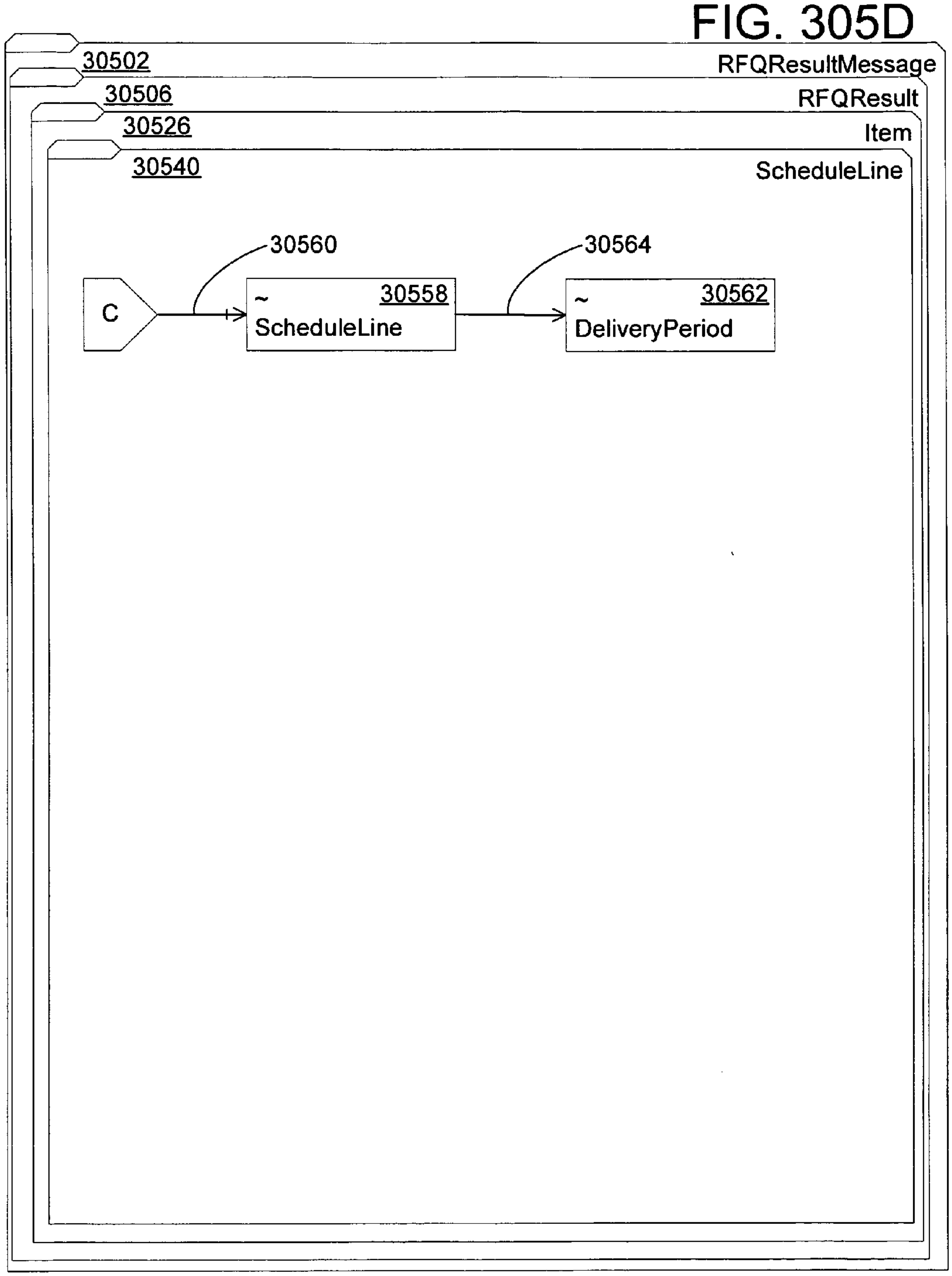

The message data type RFQCancellationMessage groups together the business information relevant for sending a business document in a message and the RFQCancellation object in the document. As depicted in FIG. 303, the RFQMessage package 30302 includes a MessageHeader package 30304, an RFQCancellation package 30306, and an RFQCancellation-Message entity 30308. The message data type RFQCancellationMessage makes the structure available for the message type RFQCancellationRequest and the relevant interfaces.

(a) Message Header Package

The MessageHeader package 30304 includes a MessageHeader entity 30310. There is a 1:1 relationship 30312 between the RFQCancellationMessage entity 30308 and the MessageHeader entity 30310. The MessageHeader entity 30310 includes a SenderParty entity 30314 and a RecipientParty entity 30316. There is a 1:c relationship 30318 between the MessageHeader entity 30310 and the SenderParty entity 30314. There is a 1:cn relationship 30320 between the MessageHeader entity 30310 and the RecipientParty entity 30316.

(b) RFQ Cancellation Package

The RFQCancellation package 30306 groups together the RFQCancellations. The RFQCancellation is a cancellation of an RFQ from a buyer to a bidder.

The RFQCancellation package 30306 includes an RFQCancellation entity 30322. There is a 1:1 relationship 30324 between the RFQCancellationMessage entity 30308 and the RFQCancellation entity 30322. The RFQCancellation entity 30322 is of type GDT: RFQCancellation. The RFQCancellation entity 30322 includes an ID, which is a unique identifier specified by the buyer for the RFQ. The ID is of type GDT: BusinessTransactionDocumentID.

(4) Message Data Type Quote Message

The message data type QuoteMessage groups together the business information relevant for sending a business document in a message and the Quote object in the document. As depicted in FIG. 304, the QuoteMessage package 30402 includes a MessageHeader package 30404, a Quote package 30406, and a QuoteMessage entity 30408. The message data type QuoteMessage makes the structure available for the message type QuoteNotification and the relevant interfaces.

(a) Message Header Package

The MessageHeader package 30404 includes a MessageHeader entity 30410. There is a 1:1 relationship 30412 between the QuoteMessage entity 30408 and the MessageHeader entity 30410. The MessageHeader entity 30410 includes a SenderParty entity 30414 and a RecipientParty entity 30416. There is a 1:c relationship 30418 between the MessageHeader entity 30410 and the SenderParty entity 30414. There is a 1:cn relationship 30420 between the MessageHeader entity 30410 and the RecipientParty entity 30416.

(b) Quote Package

The Quote package 30406 includes a Party package 30422, a Location package 30424, a DeliveryInformation package 30426, a PaymentInformation package 30428, a ProductInformation package 30430, a BusinessTransactionDocumentReference package 30432, an Attachment package 30434, a Description package 30436, and an Item package 30438. The Quote package 30406 also includes a Quote entity 30440. There is a 1:1 relationship 30442 between the QuoteMessage entity 30408 and the Quote entity 30440.

The Quote is a quotation submitted by a bidder to a buyer in response to an RFQ issued for a product by the buyer. The Quote entity 30440 is subdivided into QuoteItems, which contain the concrete quotation submitted by the bidder with reference to the relevant item in the buyer's RFQ. The structure of the packages in the Quote is the same as the structure of the packages in the RFQ. The Quote entity 30440 is of type GDT: Quote. The Quote entity 30440 includes an ID, a PostingDateTime, a LastChangeDateTime, a BindingDateTime, a Note, and a ContractTargetAmount. The ID is a unique identifier specified by the buyer for the quotation. The ID is of type GDT: BusinessTransactionDocumentID. The PostingDateTime is the creation date/time of the quotation at the bidder. The PostingDateTime is of type GDT: DateTime. The LastChangeDateTime is the date/time of the last change made to the quotation by the bidder. The LastChangeDateTime is of type GDT: DateTime. The BindingDateTime is the date/time up to which bidders are bound to the quotations they have submitted. The BindingDateTime is of type GDT: DateTime. The Note is a short description or the title of the quotation. It is generally used to provide the user with a simple method for searching for a particular quotation. The Note is of type GDT: Note. The ContractTargetAmount is the target amount in contractual negotiations. The ContractTargetAmount is of type GDT: Amount. In one implementation, the Quote entity 30440 is used as a quotation from a bidder who has taken the initiative to submit a quotation without an RFQ being issued beforehand.

(i) Quote Party Package

The Party package 30422 groups together the business parties that occur in one of the Quote messages. The Party package 30422 includes a BuyerParty entity 30444, a BidderParty entity 30446, a BidderPortalProviderParty entity 30448, a ProductRecipientParty entity 30450, a VendorParty entity 30452, a ManufacturerParty entity 30454, and a PayerParty entity 30456. There is a respective 1:c relationship 30458, 30460, 30462, 30464, 30466, 30468, and 30470 between the Quote entity 30440 and the BuyerParty entity 30444, the BidderParty entity 30446, the BidderPortalProviderParty entity 30448, the ProductRecipientParty entity 30450, the VendorParty entity 30452, the ManufacturerParty entity 30454, and the PayerParty entity 30456.

The BuyerParty entity 30444 includes an Address entity 30472 and a Contact entity 30474. There is a 1:c relationship 30476 between the BuyerParty entity 30444 and the Address entity 30472, and a 1:c relationship 30478 between the BuyerParty entity 30444 and the Contact entity 30474.

The Address entity 30472 includes a PersonName entity 30480, an Office entity 30482, a PhysicalAddress entity 30484, a GeoCoordinates entity 30486, and a Communication entity 30488. There is a respective 1:c relationship 30490, 30492, 30494, 30496, and 30498 between the Address entity 30472 and the PersonName entity 30480, the Office entity 30482, the PhysicalAddress entity 30484, the GeoCoordinates entity 30486, and the Communication entity 30488.

The Contact entity 30474 includes an Address entity 30400A. There is a 1:c relationship 30402A between the Contact entity 30474 and the Address entity 30400A.

The Address entity 30400A includes a PersonName entity 30404A, an Office entity 30406A, a PhysicalAddress entity 30408A, a GeoCoordinates entity 30410A, and a Communication entity 30412A. There is a respective 1:c relationship

30414A, 30416A, 30418A, 30420A, and 30422A between the Address entity 30400A and the PersonName entity 30404A, the Office entity 30406A, the PhysicalAddress entity 30408A, the GeoCoordinates entity 30410A, and the Communication entity 30412A.

Each of the BidderParty entity 30446, the BidderPortalProviderParty entity 30448, the ProductRecipientParty entity 30450, the VendorParty entity 30452, the ManufacturerParty entity 30454, and the PayerParty entity 30456 includes the same elements as that described above for the BuyerParty entity 30444, as denoted by ellipses 30424A, 30426A, 30428A, 30430A, 30432A, and 30434A.

(ii) Quote Location Package

A Location package 30424 groups together the locations that can occur in one of the Quote messages. The Location package 30424 includes a ShipToLocation entity 30436A. There is a 1:c relationship 30438A between the Quote entity 30440 and the ShipToLocation entity 30436A. The ShipToLocation entity 30436A includes an Address entity 30440A. There is a 1:c relationship 30442A between the ShipToLocation entity 30436A and the Address entity 30440A.

The Address entity 30440A includes a PersonName entity 30444A, an Office entity 30446A, a PhysicalAddress entity 30448A, a GeoCoordinates entity 30450A, and a Communication entity 30452A. There is a respective 1:c relationship 30454A, 30456A, 30458A, 30460A, and 30462A between the Address entity 30440A and the PersonName entity 30444A, the Office entity 30446A, the PhysicalAddress entity 30448A, the GeoCoordinates entity 30450A, and the Communication entity 30452A.

(iii) Quote Delivery Information Package

A DeliveryInformation package 30426 groups together the information about a required delivery in a Quote process. The DeliveryInformation package 30426 includes a DeliveryTerms entity 64A. There is a 1:c relationship 30466A between the Quote entity 30440 and the DeliveryTerms entity 30464A.

The DeliveryTerms entity 30464A includes an Incoterms entity 30468A. There is a 1:c relationship 30470A between the DeliveryTerms entity 30464A and the Incoterms entity 30468A.

(iv) Quote Payment Information Package

A PaymentInformation package 30428 groups together the payment information in a Quote process. The PaymentInformation package 30428 includes a CashDiscountTerms entity 30472A and a PaymentForm entity 30474A. There is a 1:c relationship 30476A between the Quote entity 30440 and the CashDiscountTerms entity 30472A, and a 1:c relationship 30478A between the Quote entity 30440 and the PaymentForm entity 30474A.

(v) Quote Product Information Package

The ProductInformation package 30430 groups together the product category. The ProductInformation package 30430 includes a ProductCategory entity 30480A. There is a 1:c relationship 30482A between the Quote entity 30440 and the ProductCategory entity 30480A.

(vi) Quote Business Transaction Document Reference Package

The BusinessTransactionDocumentReference package 30432 groups together the business document references that can occur in the Quote message. The BusinessTransactionDocumentReference package 30432 includes an RFQReference entity 30484A. There is a 1:c relationship 30486A between the Quote entity 30440 and RFQReference entity 30484A.

The RFQReference is a reference to a request for quotation or item in a request for quotation. The RFQReference entity 30484A is of type GDT: BusinessTransactionDocumentReference. In one implementation, an RFQReference entity 30484A can reference one RFQ, that is, one ID is permissible. As far as the referenced RFQ is concerned, there are no conflicts with an RFQReference at the item level. If a reference is used at both the header and item levels, it refers to one (the same) RFQ.

In one implementation, the reference to an RFQ is required at both the header and item levels, since RFQs do not always have item data. Unless otherwise agreed, the bidder uses the RFQID assigned by the buyer.

(vii) Quote Attachment Package

The Attachment package 30434 groups together the attachment information regarding the Quote. The Attachment package 30434 includes an Attachment entity 30488A. The Attachment is any document that refers to the Quote. The Attachment entity 30488A is of type GDT: Attachment. There is a 1:cn relationship 30490A between the Quote entity 30440 and the Attachment entity 30488A.

(viii) Quote Description Package

The Description package 30436 groups together the texts regarding the Quote. The Description package 30436 includes a Description entity 30492A. The Description entity 30492A is of type GDT: Description. There is a 1:c relationship 30494A between the Quote entity 30440 and the Description entity 30492A.

(ix) Quote Item Package

A QuoteItem package 30438 includes a QuoteItem entity 30496A. There is a 1:cn relationship 30498A between the Quote entity 30440 and the QuoteItem entity 30496A.

QuoteItem entities are arranged hierarchically using a Hierarchy Relationship 30400B. The Hierarchy Relationship 30400B is the relationship between a sub-item and a higher-level parent item in an item hierarchy. There is a 1:cn relationship 30402B between the Item entity 30496A and its subordinate entities, and there is a 1:c relationship 30404B between the Item entity 30496A and its superordinate entities.

The QuoteItem includes the bidder's quotation for a product tendered in an item of a request for quotation (RFQItem) or additional information about this product. Quantities and delivery dates can also be specified here. The structure is the same as the structure of the RFQItem. The QuoteItem entity 30496A is of type GDT: QuoteItem. The QuoteItem entity 30496A includes an ID and a ContractTargetAmount. The ID is a unique identifier specified by the buyer for a quotation item within an RFQ. The ID is of type GDT: BusinessTransactionDocumentItemID. The ContractTargetAmount is the target amount in contractual negotiations. The ContractTargetAmount is of type GDT: Amount.

The QuoteItem package 30438 also includes a ProductInformation package 30406B, a PriceInformation package 30408B, a Party package 30410B, a Location package 30412B, a DeliveryInformation package 30414B, a BusinessTransactionDocumentReference package 30416B, an Attachment package 30418B, a Description package 30420B, and a ScheduleLine package 30422B.

(a) Quote Item Product Information Package

A ProductInformation package 30406B groups together the product and the product category. The ProductInformation package 30406B includes a Product entity 30424B and a ProductCategory entity 30426B. There is a 1:c relationship 30428B between the Item entity 30496A and the Product entity 30424B, and a 1:c relationship 30430B between the Item entity 30496A and the ProductCategory entity 30426B.

(b) Quote Item Price Information Package

The PriceInformation package 30408B groups together price information in a quotation item. The PriceInformation package 30408B includes a Price entity 30432B. There is a 1:c relationship 30434B between the Item entity 30496A and the Price entity 30432B. In one implementation, the PriceInformation package 30408B for an RFQ item includes prices; it does not contain any information about how the prices are calculated, e.g., pricing scales. A Price is a quotation price that has been defined by the bidder in an RFQ.

The Price entity 30432B includes a NetUnitPrice, which is the net price (without tax or cash discount) specified by the bidder for the base quantity for the quotation in an RFQ. The NetUnitPrice is of type GDT: Price.

(c) Quote Item Party Package

The Party package 30410B includes a BuyerParty entity 30436B, a BidderParty entity 30438B, a ProductRecipientParty entity 30440B, a VendorParty entity 30442B, and a ManufacturerParty entity 30444B. There is a respective 1:c relationship 30446B, 30448B, 30450B, 30452B, and 30454B between the Item entity 30496A and the BuyerParty entity 30436B, the BidderParty entity 30438B, the ProductRecipientParty entity 30440B, the VendorParty entity 30442B, and the ManufacturerParty entity 30444B. Each of the BuyerParty entity 30436B, the BidderParty entity 30438B, the ProductRecipientParty entity 30440B, the VendorParty entity 30442B, and the ManufacturerParty entity 30444B includes the same elements as that described above for the BuyerParty entity 30444 as denoted by ellipses 30456B, 30458B, 30460B, 30462B, and 30464B. In one implementation, the Quote is used as a quotation from a bidder who has taken the initiative to submit a quotation without an RFQ being issued beforehand.

(d) Quote Item Location Package

Similar to the Location package 30224 at the header level, the Location package 30412B at the item level includes a ShipToLocation entity 30466B. There is a 1:c relationship 30468B between the Item entity 30496A and the ShipToLocation entity 30466B. The ShipToLocation entity 30488B includes the same elements as that described above for the ShipToLocation entity 36A as denoted by ellipses 30470B.

(e) Quote Item Delivery Information Package

Similar to the DeliveryInformation package 30426 at the header level, the DeliveryTerms package 30414B at the item level includes a DeliveryTerms entity 30472B. There is a 1:c relationship 30474B between the Item entity 30496A and the DeliveryTerms entity 30472B. The DeliveryTerms entity 30472B includes an Incoterms entity 30476B. There is a 1:c relationship 30478B between the DeliveryTerms entity 30472B and the Incoterms entity 30476B.

(f) Quote Item Business Transaction Document Reference Package

A BusinessTransactionDocumentReference package 30416B groups together the business document references that can occur in the QuoteNotification message. It includes an RFQReference entity 30480B. There is a 1:c relationship 30482B between the Item entity 30496A and the RFQReference entity 30480B.

An RFQReference is a reference to the RFQ or the item within the RFQ. The RFQReference entity 30480B is of type GDT: BusinessTransactionDocumentReference.

In one implementation, an RFQReference entity 30480B can reference one item, that is, one ItemID is permissible. As far as the referenced RFQ is concerned, there are no conflicts with an RFQReference at the header level. If an RFQ reference is maintained at both header and item level, it refers to one (the same) RFQ. Unless otherwise agreed, the bidder uses the RFQID and RFQItemID assigned by the buyer.

(g) Quote Item Attachment Package

The QuoteItemAttachment package 30418B includes an Attachment entity 30484B. There is a 1:c relationship 30486B between the Item entity 30496A and the Attachment entity 30484B.

(h) Quote Item Description Package

The QuoteItemDescription package 30420B includes a Description entity 30488B. There is a 1:c relationship 30490B between the Item entity 30496A and the Description entity 30488B.

(i) Quote Item Schedule Line Package

The QuoteItemScheduleLinePackage 30422B includes a ScheduleLine entity 30492B. There is a 1:c relationship 30494B between the Item entity 30496A and the ScheduleLine entity 30492B. The ScheduleLine entity 30492B includes a DeliveryPeriod entity 30496B. There is a 1:1 relationship 30498B between the ScheduleLine entity 30492B and the DeliveryPeriod entity 30496B.

(5) Message Data Type RFQ Result Message

The message data type RFQResultMessage groups together the business information relevant for sending a business document in a message and the RFQResult object in the document. As depicted in FIG. 305, the RFQResultMessage package 30502 includes a MessageHeader package 30504 and a RFQResult package 30506. The RFQResultMessage package 30502 also includes an RFQResultMessage entity 30508. The message data type RFQResultMessage makes the structure available for the message type RFQResultMessage and the relevant interfaces.

(a) Message Header Package

The MessageHeader package 30504 includes a MessageHeader entity 30510. There is a 1:1 relationship 30512 between the RFQResultMessage entity 30508 and the MessageHeader entity 30510. The MessageHeader entity 30510 includes a SenderParty entity 30514 and a RecipientParty entity 30516. There is a 1:c relationship 30518 between the MessageHeader entity 30510 and the SenderParty entity 30514, and a 1:cn relationship 30520 between the MessageHeader entity 30510 and the RecipientParty entity 30516.

(b) RFQ Result Package

The RFQResult package 30506 includes a Party package 30522, a Description package 30524, and an Item package 30526. The RFQResult package 30506 also includes an RFQResult entity 30528. There is a 1:1 relationship 30529 between the RFQResultMessage entity 30508 and the RFQResult entity 30528. The RFQResult is the acceptance or rejection of a bidder's quotation by the buyer. The RFQResult entity 30528 is of type GDT: RFQResult. The RFQResult entity 30528 includes an ID, which is a unique identifier specified by the buyer for the RFQ.

(i) RFQ Result Party Package

The Party package 30522 groups together the parties that can occur in one of the RFQResult messages. The Party package 30522 includes a BidderParty entity 30530. There is a 1:c relationship 30532 between the RFQResult entity 30528 and the BidderParty entity 30530.

A BidderParty is a party that bids for goods or services. The BidderParty entity 30530 is of type GDT: BusinessTransactionDocumentParty. The BidderParty entity 30530 is required for the RFQResult message if the result of the RFQ is to be published on a tendering platform. The configuration determines whether this scenario applies.

(ii) RFQ Result Description Package

The RFQ Result Description package 30524 includes a Description entity 30534. There is a 1:c relationship 30536 between the RFQResult entity 30528 and the Description entity 30534.

(iii) RFQ Result Item Package

The RFQResultItem package 30526 includes a BusinessTransactionDocumentReference package 30538 and a ScheduleLine package 30540. The RFQResultItem package 30526 also includes an RFQResultItem entity 30542. There is a 1:cn relationship 30544 between the RFQResult entity 30528 and the RFQResultItem entity 30542. RFQResultItem entities are arranged hierarchically using a Hierarchy Relationship 30546. The Hierarchy Relationship 30546 is the relationship between a sub-item and a higher-level parent item in an item hierarchy. There is a 1:cn relationship 30548 between the Item entity 30542 and its subordinate entities, and there is a 1:c relationship 30550 between the Item entity 30542 and its superordinate entities.

An RFQResultItem specifies the rejection or the extent of the acceptance of a bidder's quotation for a product of an RFQ item. The RFQResultItem entity 30542 is of type GDT: RFQResultItem. The RFQResultItem entity 30542 includes an ID, which is an identifier assigned by the buyer to an RFQ item. The identifier is unique within a particular RFQ. The ID is of type GDT: BusinessTransactionDocumentItemID.

(a) RFQ Result Item Business Transaction Document Reference Package

A BusinessTransactionDocumentReference package 30538 groups together the business document references that occur in one of the RFQResult messages. The BusinessTransactionDocumentReference package 30538 includes a QuoteReference entity 30552. There is a 1:c relationship 30554 between the Item entity 30542 and the QuoteReference entity 30552.

The QuoteReference is a reference to the quotation or the item within the quotation. The QuoteReference entity 30552 is of type GDT: BusinessTransactionDocumentReference. In one implementation, a QuoteReference entity 30552 can reference one item, that is, one ItemID is permissible.

(b) RFQ Result item Schedule Line Package

The RFQResultItemScheduleLine Package 30540 includes a ScheduleLine entity 30558. There is a 1:c relationship 30560 between the Item entity 30542 and the ScheduleLine entity 30558. The ScheduleLine entity 30558 includes a DeliveryPeriod entity 30562. There is a 1:1 relationship 30564 between the ScheduleLine entity 30558 and the DeliveryPeriod entity 30562.

(6) Message Data Type Element Structure (a) Data Type RFQ Message

FIGS. 306A-O depict the element structure for RFQRequest and RFQChangeRequest. The element structure is similar to the data model, but provides additional information regarding the details of the interface. The element structure identifies the different packages 30600 in the interface, and represents the entities at various levels within the interface. As depicted in FIGS. 306A-O, the interface for RFQRequest and RFQChangeRequest includes six levels 30602, 30604, 30606, 30608, 30610, and 30612. The element structure identifies the cardinality or occurrence 30614 between the entities and/or attributes of the interface, and provides information (i.e., type 30616 and name 30618) regarding the data type that provides the basis for the entity and/or attribute. The outermost package of this interface is an RFQMessage package 30620, which includes an RFQMessage entity 30622 at the first level 30602. The RFQMessage entity 30622 is of type message data type ("MDT") 30624 "RFQMessage" 30626.

The RFQMessage package 30620 includes a MessageHeader package 30628 and an RFQ package 30630. The MessageHeader package 30628 includes a MessageHeader entity 30632, which is of type generic data type ("AGDT") 30636 "BusinessDocumentMessageHeader" 30638. There is one 30634 MessageHeader entity 30632 for each RFQMessage entity 30622.

The MessageHeader entity 30632 includes an ID 30640, a Reference ID 30648, and a CreationDateTime 30656. The ID 30640 is of type GDT 30644 BusinessDocumentMessageID 30646. The ReferenceID 30648 is of type GDT 30652 BusinessDocumentMessageID 30654. The CreationDateTime 30656 is of type GDT 30660 DateTime 30662. There is one 30642 ID 30640 for each MessageHeader entity 30632, one or zero 30650 ReferenceID 30648 for each MessageHeader entity 30632, and one 30658 CreationDateTime 30656 for each MessageHeader entity 30632.

The MessageHeader entity 30632 also includes a SenderParty entity 30664 and a RecipientParty entity 30628A. The SenderParty entity 30664 is of type AGDT 30668 BusinessDocumentMessageHeaderParty 30670. The RecipientParty entity 30628A is also of type AGDT 30632A BusinessDocumentMessageHeaderParty 30634A. There is one or zero 30666 SenderParty entity 30664 for each MessageHeader entity 30632, and there is any number 30630A of RecipientParty entities 30628A for each MessageHeader entity 30632.

The SenderParty entity 30664 includes an InternalID 30672, a StandardID 30680, and a ContactPerson 30688. The InternalID 30672 has zero or one occurrences 30674 for each SenderParty entity 30664 and a data type CDT 30676 of PartyInternalID 30678. The StandardID 30680 has any number of occurrences 30682 for each SenderParty entity 30664 and has a data type of CDT 30684 PartyStandardID 30686. The ContactPerson 30688 has zero or one occurrences 30690 for each SenderParty entity 30664 and is of data type AGDT 30692 ContactPerson 30694. The ContactPerson 30688 also includes an InternalID 30696, BuyerID 30604A, BidderID 30612A, and an Address 30620A. The InternalID 30696 has any number of occurrences 30698 for each ContactPerson 30688 and a data type of CDT 30600A ContactPersonInternalID 30602A. The BuyerID 30604A has zero or one occurrences 30606A for each ContactPerson 30688 and a data type of CDT 30608A ContactPersonPartyID 30610A. The BidderID 30612A has zero or one occurrences 30614A for each ContactPerson 30688 and a data type of CDT 30616A ContactPersonPartyID 30618A. The Address 30620A has one or zero occurrences 30622A for each ContactPerson 30688 and a data type of AGDT 30624A Address 30626A.

The RFQ package 30630 includes an RFQ entity 30636A. There is one 30638A RFQ entity 30636A for each RFQMessage entity 30622. The RFQ entity 30636A has a data type of AGDT 30640A RFQ 30642A. The RFQ entity 30636A includes an ID 30644A, a PostingDateTime 30652A, a LastChangeDateTime 30660A, a PublishDateTime 30668A, a DisplayDateTime 30676A, an BiddingStartDateTime 30684A, a QuoteSubmissionDateTime 30692A, a QuoteOpeningDateTime 30600B, a QuoteBindingDateTime 30608B, a ContractValidityPeriod 30616B, a Note 30624B, an RFQPublicIndicator 30632B, a QuoteUnplannedItemPermissionCode 30640B, a QuotePriceBiddingConditionCode 30648B, a QuoteQuantityBiddingConditionCode 30656B, a QuoteItemBiddingConditionCode 30664B, and a ContractTargetAmount 30672B.

There is one 30646A ID 30644A for each RFQ entity 30636A. The ID 30644A is of type GDT 30648A BusinessTransactionDocumentID 30650A. A PostingDateTime 30652A has zero or one occurrences 30654A for each RFQ entity 30636A and is of type GDT 30656A DateTime 30658A. LastChangeDateTime 30660A has zero or one occurrences 30662A for each RFQ entity 30636A and is of type GDT 30664A DateTime 30666A. PublishDateTime 30668A has zero or one occurrences 30670A for each RFQ entity 30636A and is of type GDT 30672A DateTime 30674A. DisplayDateTime 30676A has zero or one occurrences 30678A for each RFQ entity 30636A and is of type GDT 30680A DateTime 30682A. BiddingStartDateTime 30684A has zero or one occurrences 30686A for each RFQ entity 30636A and is of type GDT 30688A DateTime 30690A. QuoteSubmissionDateTime 30692A has one occurrence 30694A for each RFQ entity 30636A and is of type GDT 30696A DateTime 30698A. QuoteOpeningDateTime 30600B has zero or one occurrences 30602B for each RFQ entity 30636A and is of type GDT 30604B DateTime 30606B. QuoteBindingDateTime 30608B has zero or one occurrences 30610B for each RFQ entity 30636A and is of type GDT 30612B DateTime 30614B. ContractValidityPeriod 30616B has zero or one occurrences 30618B for each RFQ entity 30636A and is of type GDT 30620B DateTimePeriod 30622B. Note 30624B has zero or one occurrences 30626B for each RFQ entity 30636A and is of type GDT 30628B Note 30630B. RFQPublicIndicator 30632B has one occurrence 30634B for each RFQ entity 30636A and is of type GDT 30636B BusinessTransactionDocumentPublicIndicator 30638B. QuoteUnplannedItemPermissionCode 30640B has zero or one occurrences 30642B for each RFQ entity 30636A and is of type GDT 30644B UnplannedItemPermissionCode 30646B. QuoteQuantityBiddingConditionCode 30656B has one occurrence 30658B for each RFQ entity 30636A and is of type GDT 30660B BiddingConditionCode 30662B. The QuoteItemBiddingConditionCode 30664B has one occurrence 30666B for each RFQ entity 30636A and a data type GDT 30668B BiddingConditionCode 30670B, and ContractTargetAmount 30672B has zero or one occurrences 30674B for each RFQ entity 30636A and is of type GDT 30676B Amount 30678B.

The Party package 30680B includes a BuyerParty entity 30600C, a BidderParty entity 30672C, a BidderPortalPartyProvider entity 30680C, a ProductRecipientParty entity 30688C, a VendorParty entity 30696C, a ManufacturerParty entity 30604D, and a PayerParty entity 30612D.

The BuyerParty entity 30600C is of type AGDT 30604C BusinessTransactionDocumentParty 30606C. There is one or zero 30602C BuyerParty entity 30600C for each RFQ entity 30636A. The BidderParty entity 30672C is of type AGDT 30676C BusinessTransactionDocumentParty 30678C. There is zero or one 30674C BidderParty entity 30672C for each RFQ entity 30636A. The BidderPortalProviderParty entity 30680C is of type AGDT 30684C BusinessTransactionDocumentParty 30686C. There is zero or one 30682C BidderPortalPartyProvider entity 30680C for each RFQ entity 30636A. The ProductRecipientParty entity 30688C is of type AGDT 30692C BusinessTransactionDocumentParty 30694C. There is one or zero 30690C ProductRecipientParty entity 30688C for each RFQ entity 30636A. The VendorParty entity 30696C is of type AGDT 30600D BusinessTransactionDocumentParty 30602D. There is one or zero 30698C VendorParty entity 30696C for each RFQ entity 30636A. The ManufacturerParty entity 30604D is of type AGDT 30608D BusinessTransactionDocumentParty 30610D. There is one or zero 30606D ManufacturerParty entity 30604D for each RFQ entity 30636A. The PayerParty entity 30612D is of type AGDT 30616D BusinessTransactionDocumentParty 30618D. There is one or zero 30614D PayerParty entity 30612D for each RFQ entity 30636A.

The BuyerParty entity 30600C includes a StandardID 30608C, a BuyerID 30616C, a BidderID 30624C, an Address 30632C, and a ContactPerson 30640C. The StandardID 30608C has any number of occurrences 30610C for each BuyerParty entity 30600C and a data type of CDT 30612C PartyStandardID 30614C. The BuyerID 30616C has zero or one occurrences 30618C for each BuyerParty entity 30600C and a data type of CDT 30620C PartyPartyID 30622C. The BidderID 30624C has zero or one occurrences 30626C for each BuyerParty entity 30600C and a data type of CDT 30628C PartyPartyID 30630C. The Address 30632C has zero or one occurrences 30634C for each BuyerParty entity 30600C and a data type of AGDT 30636C Address 30638C. The ContactPerson 30640C has zero or one occurrences 30642C for each BuyerParty entity 30600C and a data type of AGDT 30644C ContactPerson 30646C. The ContactPerson 30640C also includes a BuyerID 30648C, BidderID 30656C and an Address 30664C. The BuyerID 30648C has zero or one occurrences 30650C for each ContactPerson 30640C and a data type of CDT 30652C ContactPersonPartyID 30654C. The BidderID 30656C has zero or one occurrences 30658C for each ContactPerson 30640C and a data type of CDT 30660C ContactPersonPartyID 30662C. The Address 30664C has one or zero occurrences 30666C for each ContactPerson 30640C and a data type of AGDT 30668C Address 30670C.

The Location package 30682B includes a ShipToLocation entity 30620D. The ShipToLocation entity 30620D is of type AGDT 30624D BusinessTransactionDocumentLocation 30626D. There is one or zero 30622D ShipToLocation entity 30620D for each RFQ entity 30636A. The ShipToLocation entity 30620D includes a StandardID 30628D, a BuyerID 30636D, a BidderID 30644D, and an Address 30652D. The StandardID 30628D has any number of occurrences 30630D for each ShipToLocation entity 30620D and a data type of CDT 30632D LocationStandardID 30634D. The BuyerID 30636D has zero or one occurrences 30638D for each ShipToLocation entity 30620D and a data type of CDT 30640D LocationPartyID 30642D. The BidderID 30644D has zero or one occurrences 30646D for each ShipToLocation entity 30620D and a data type of CDT 30648D LocationPartyID 30650D. The Address 30652D has zero or one occurrences 30654D for each ShipToLocation entity 30620D and a data type of AGDT 30656D Address 30658D.

The DeliveryInformation package 30684B includes a DeliveryTerms entity 30660D. The DeliveryTerms entity 30660D is of type AGDT 30664D DeliveryTerms 30666D. There is one or zero 30662D Delivery Terms entity 30660D for each RFQ entity 30636A. The DeliveryTerms entity 30660D includes an Incoterms entity 30668D, which is of type GDT 30672D Incoterms 30674D. There is one or zero 30670D Incoterms entity 30668D for each DeliveryTerms entity 30660D.

The PaymentInformation package 30686B includes a CashDiscountTerms entity 30676D, which is of type AGDT 30680D CashDiscountTerms 30682D. There is one or zero 30678D CashDiscountTerms entity 30676D for each RFQ entity 30636A. The CashDiscountTerms entity 30676D includes a MaximumCashDiscount 30684D, a NormalCashDiscount 30692D, and FullPaymentDueDaysValue 30600E. There is one or zero occurrences 30686D of the MaximumCashDiscount 30684D for each CashDiscountTerms entity 30676D. The MaximumCashDiscount 30684D is of type GDT 30688D CashDiscount 30690D. There is one or zero occurrences 30694D of the NormalCashDiscount 30692D for each CashDiscountTerms entity 30676D. The NormalCashDiscount 30692D is of type GDT 30696D CashDiscount 30698D. There is one or zero occurrences 30602E of the FullPaymentDueDaysValue 30600E for each CashDiscountTerms entity 30676D.

The PaymentInformation package 30684B also includes a PaymentForm entity 30604E. There is one or zero 30606E PaymentForm entity 30604E for each RFQ entity 30636A. The PaymentForm entity 30604E includes a Code 30608E that is of type GDT 30612E PaymentFormCode 30614E. There is one 30610E Code 30608E for each PaymentForm entity 30604E.

The ProductInformation package 30688B includes a ProductCategory entity 30616E. The ProductCategory entity 30616E is of type GDT 30620E BusinessTransactionDocumentProductCategory 30622E. There is one or zero 30618E ProductCategory entity 30616E for each RFQ entity 30636A. The ProductCategory entity 30616E includes a StandardID 30624E, a BuyerID 30632E, and a BidderID 30640E. The StandardID 30624E has any number of occurrences 30626E for each ProductCategory entity 30616E and a data type of CDT 30628E ProductCategoryStandardID 30630E. The BuyerID 30632E has zero or one occurrences 30634E for each ProductCategory entity 30616E and a data type of CDT 30636E ProductCategoryPartyID 30638E. The BidderID 30640E has zero or one occurrences 30642E for each ProductCategory entity 30616E and a data type of CDT 30644E ProductCategoryPartyID 30646E.

The BusinessTransactionDocumentReference package 30690B includes a QuoteReference entity 30648E. The QuoteReference entity 30648E is of type GDT 30652E BusinessTransactionDocumentReference 30654E. There is one or zero 30650E QuoteReference entities 30648E for each RFQ entity 30636A. The QuoteReference entity 30648E includes an ID 30656E, and there is one occurrence 30658E of the ID 30656E for each QuoteReference 30648E. The ID 30656E is of type GDT 30660E BusinessTransactionDocumentID 30662E.

The FollowUpBusinessTransactionDocument package 30692B includes a FollowUpPurchaseOrder entity 30664E and a FollowUpPurchaseDocument 30676E. There is zero or one occurrence 30666E of the FollowUpPurchaseOrder entity 30664E for each RFQ entity 30636A and one or zero occurrences 30678E of the FollowUpPurchaseDocument entity 30676E for each RFQ entity 30636A. The FollowUpPurchaseOrder entity 30664E includes a RequirementCode 30668E which has one occurrence 30670E for each FollowUpPurchaseOrder entity 30664E and is of type GDT 30672E FollowUpBusinessTransactionDocumentRequirementCode 30674E. The FollowUpPurchaseDocument entity 30676E includes a RequirementCode entity 30680E which has one occurrence 30682E for each FollowUpPurchaseDocument entity 30676E and is of type GDT 30684E.

The Attachment package 30694B includes an Attachment entity 30688E, which is of type GDT 30692E Attachment 30694E. There is any number 30690E of Attachment entities 30688E for each RFQ entity 30636A.

The Description package 30696B includes a Description entity 30696E. The Description entity 30696E is of type GDT 30600F Description 30602F. There is one or zero 30698E Description entities 30696E for each RFQ entity 30636A.

The Item package 30698B includes an Item entity 30604F which is of type AGDT 30608F RFQItem 30610F. There is any number 30606F of Item entities 30604F for each RFQ entity 30636A. The Item entity 30604F includes an ID 30612F, a ContractTargetAmount 30620F, and a HierarchyRelationship 30628F. The ID 30612F is of type GDT 30616F BusinessTransactionDocumentItemID 30618F, and there is one 30614F ID 30612F for each Item entity 30604F. The ContractTargetAmount 30620F is of type GDT 30624F Amount 30626F, and there is one or zero 30622F ContractTargetAmount 30620F for each Item entity 30604F. There is one or zero 30630F HierarchyRelationship 30628F for each Item entity 30604F. The HierarchyRelationship 30628F includes a ParentItemID 30632F, which is of type GDT 30636F BusinessTransactionDocumentItemID 30638F, and a TypeCode 30640F, which is of type GDT 30644F BusinessTransactionDocumentHierarchyRelationshipTypeCode 30646F. There is one 30634F ParentItemID 30632F for each HierarchyRelationship 30628F, and there is one 30642F TypeCode 30640F for each HierarchyRelationship 30628F.

The Item package 30698B also includes a ProductInformation package 30648F, a Party package 30650F, a Location package 30652F, a DeliveryInformation package 30654F, a BusinessTransactionDocumentReference package 30656F, an Attachment package 30658F, a Description package 30660F, and a ScheduleLine package 30662F.

The ProductInformation package 30648F includes a Product entity 30664F and a ProductCategory entity 30620G. The Product entity 30664F is of type GDT 30668F BusinessTransactionDocumentProduct 30670F. There is one or zero 30666F Product entity 30664F for each Item entity 30604F. The ProductCategory entity 30620G is of type GDT 30624G BusinessTransactionDocumentProductCategory 30626G. There is one or zero 30622G ProductCategory entity 30620G for each Item entity 30604F.

The Product entity 30664F includes a StandardID 30672F, a BuyerID 30680F, a BidderID 30688F, an ManufacturerID 30696F, TypeCode 30604G and a Note 30612G. The StandardID 30672F has any number of occurrences 30674F for each Product entity 30664F and a data type of CDT 30676F ProductStandardID 30678F. The BuyerID 30680F has zero or one occurrences 30682F for each Product entity 30664F and a data type of CDT 30684F ProductPartyID 30686F. The BidderID 30688F has zero or one occurrences 30690F for each Product entity 30664F and a data type of CDT 30692F ProductPartyID 30694F. The ManufacturerID 30696F has zero or one occurrences 30698F for each Product entity 30664F and a data type of CDT 30600G ProductPartyID 30602G. The TypeCode 30604G has zero or one occurrences 30606G for each Product entity 30664F and a data type of GDT 30608G ProductTypeCode 30610G. The Note 30612G has zero or one occurrences 30614G and a data type of GDT 30616G Note 30618G.

The ProductCategory entity 30620G includes a StandardID 30628G, a BuyerID 30636G, and a BidderID 30644G. The StandardID 30628G has any number of occurrences 30630G for each ProductCategory entity 30620G and a data type of CDT 30632G ProductCategoryStandardID 30634G. The BuyerID 30636G has zero or one occurrences 30638G for each ProductCategory entity 30620G and a data type of CDT 30640G ProductCategoryPartyID 30642G. The BidderID 30644G has zero or one occurrences 30646G for each ProductCategory entity 30620G and a data type of CDT 30648G ProductCategoryPartyID 30650G.

The Party package 30650F includes a BuyerParty entity 30652G, a BidderParty entity 30660G, a ProductRecipientParty entity 30668G, a VendorParty entity 30676G, and a ManufacturerParty entity 30684G.

The BuyerParty entity 30652G is of type AGDT 30656G BusinessTransactionDocumentParty 30658G. There is one or zero 30654G BuyerParty entity 30652G for each Item entity 30604F. The BidderParty entity 30660G is of type AGDT 30664G BusinessTransactionDocumentParty 30666G. There is zero or one 30662G BidderParty entity 30660G for each Item entity 30604F. There is zero or one 30670G ProductRecipientParty entity 30668G for each Item entity 30604F. The ProductRecipientParty entity 30668G is of type AGDT 30672G BusinessTransactionDocumentParty 30674G. The VendorParty entity 30676G is of type AGDT 30680G BusinessTransactionDocumentParty 30682G. There is one or zero 30678G VendorParty entity 30676G for each Item entity 30604F. The ManufacturerParty entity 30684G is of type AGDT 30688G BusinessTransactionDocumentParty 30690G. There is one or zero 30686G ManufacturerParty entity 30684G for each Item entity 30604F.

The Location package 30652F includes a ShipToLocation entity 30692G. The ShipToLocation entity 30692G is of type AGDT 30696G BusinessTransactionDocumentLocation 30698G. There is one or zero 30694G ShipToLocation entity 30692G for each Item entity 30604F. The ShipToLocation entity 30692G includes a StandardID 30600H, a BuyerID 30608H, a BidderID 30616H, and an Address 30624H. The StandardID 30600H has any number of occurrences 30602H for each ShipToLocation entity 30692G and a data type of CDT 30604H LocationStandardID 30606H. The BuyerID 30608H has zero or one occurrences 30610H for each ShipToLocation entity 30692G and a data type of CDT 30612H LocationPartyID 30614H. The BidderID 30616H has zero or one occurrences 30618H for each ShipToLocation entity 30692G and a data type of CDT 30620H LocationPartyID 30622H. The Address 30624H has zero or one occurrences 30626H for each ShipToLocation entity 30692G and a data type of AGDT 30628H Address 30630H.

The DeliveryInformation package 30654F includes a DeliveryTerms entity 30632H, which is of type AGDT 30636H DeliveryTerms 30638H. There is one or zero 30634H DeliveryTerms entity 30632H for each Item entity 30604F. The DeliveryTerms entity 30632H includes an MaximumLeadTimeDuration entity 30640H, which is of type GDT 30644H Duration 30646H, and there is one or zero occurrences 30642 of the MaximumLeadTimeDuration entity 30640H for each The DeliveryTerms entity 30632H. The DeliveryTerms entity 30632H also includes an Incoterms entity 30648H which is of type GDT 30652H Incoterms 30654H. There is one or zero 30650H Incoterms entity 30648H for each of the DeliveryTerms entity 30632H.

The BusinessTransactionDocumentReference package 30656F includes a QuoteReference entity 30656H. The QuoteReference entity 30656H is of type GDT 30660H BusinessTransactionDocumentReference 30662H. There is one or zero 30658H QuoteReference entities 30656H for each Item entity 30604F. The QuoteReference entity 30686H includes an ID 30664H. There is one 30666H ID 30664H for each QuoteReference entity 30656H. The ID 30664H is of type GDT 30668H BusinessTransactionDocumentID 30670H. The QuoteReference entity 30656H also includes an ItemID 30672H. There is any number 30674H of ItemID 30672H for each Quote Reference entity 30656H. The ItemID 30672H is of type GDT 30676H BusinessTransactionDocumentItemID 30678H.

The BusinessTransactionDocumentReference package 30656F also includes a PurchaseContractReference entity 30680H. The PurchaseContractReference entity 30680H is of type GDT 30684H BusinessTransactionDocumentReference 30686H. There is one or zero 30682H PurchaseContractReference entities 30680H for each Item entity 30604F. The PurchaseContractReference entity 30680H includes an ID 30688H. There is one 30690H ID 30688H for each PurchaseContractReference entity 30680H. The ID 30688H is of type GDT 30692H BusinessTransactionDocumentID 30694H. The PurchaseContractReference entity 30680H also includes an ItemID 30696H. There is any number 30698H of ItemID 30696H for each PurchaseContractReference entity 30680H. The ItemID 30696H is of type GDT 30600I BusinessTransactionDocumentItemID 30602I.

The BusinessTransactionDocumentReference package 30656F further includes a BuyerProductCatalogueReference entity 30604I. The BuyerProductCatalogueReference entity 30604I is of type AGDT 30608I CatalogueReference 30610I. There is one or zero 30606I BuyerProductCatalogueReference entities 30604I for each Item entity 30604F. The BuyerProductCatalogueReference entity 30604I includes an ID 30612I. There is one 30614I ID 30612I for each BuyerProductCatalogueReference entity 30604I. The ID 30614I is of type GDT 30616I CatalogueID 30618I. The BuyerProductCatalogueReference entity 30604I also includes an ItemID 30620I. There is any number 30622I of ItemID 30620I for each BuyerProductCatalogueReference entity 30604I. The ItemID 30620I is of type GDT 30624I CatalogueItemID 30626I.

The Attachment package 30658F includes an Attachment entity 30628I, which is of type GDT 30632I Attachment 30634I. There is any number 30630I of Attachment entities 30628I for each Item entity 30604F.

The Description package 30660F includes a Description entity 30636I. The Description entity 30636I is of type GDT 30640I Description 30642I. There is one or zero 30638I Description entity 30636I for each Item entity 30604F.

The ScheduleLine package 30662F includes a ScheduleLine entity 30644I having an ID 30652I, DeliveryPeriod 30660I, and Quantity 30668I. The ScheduleLine entity 30644I has zero or one occurrence 30646I for each Item entity 30604F. The ScheduleLine entity 30644I is of type AGDT 30648I RFQItemScheduleLine 30650I. The ID 30652I has one or zero occurrence 30654I for each ScheduleLine entity 30644I and a data type of GDT 30656I BusinessTransactionDocumentItemScheduleLineID 30658I. The DeliveryPeriod 30660I has one occurrence 30662I for each ScheduleLine entity 30644I and a data type of AGDT 30664I DateTimePeriod 30666I. The Quantity 30668I has one or zero occurrences 30670I for each ScheduleLine entity 30644I and a data type of GDT 30672I Quantity 30674I.

(b) Data Type RFQ Cancellation Message

FIGS. 307A-C depict the element structure for RFQCancellationRequest. The element structure is similar to the data model, but provides additional information regarding the details of the interface. The element structure identifies the different packages 30700 in the interface, and represents the entities at various levels within the interface. As depicted in FIGS. 307A-C, the interface for RFQCancellationRequest includes five levels 30702, 30704, 30706, 30708, and 30710. The element structure identifies the cardinality 30712 between the entities and/or attributes of the interface, and provides information (i.e., type 30714 and name 30716) regarding the data type that provides the basis for the entity and/or attribute. The outermost package of this interface is an RFQCancellationMessage package 30718, which includes an RFQCancellationMessage entity 30720 at the first level 30702. The RFQCancellationMessage entity 30720 is of type message data type ("MDT") 30722 "RFQCancellationMessage" 30724.

The RFQCancellationMessage package 30718 includes a MessageHeader package 30726 and an RFQCancellation package 30728. The MessageHeader package 30726 includes a MessageHeader entity 30730, which is of type generic data type ("AGDT") 30734 "BusinessDocumentMessageHeader" 30736. There is one 30732 MessageHeader entity 30730 for each RFQCancellationMessage entity 30720.

The MessageHeader entity 30730 includes an ID 30738, a ReferenceID 30746, and a CreationDateTime 30754. The ID 30738 is of type GDT 30742 BusinessDocumentMessageID 30744. The ReferenceID 30746 is of type GDT 30750 BusinessDocumentMessageID 30752. The CreationDateTime 30754 is of type GDT 30758 DateTime 30760. There is one 30740 ID 30738 for each MessageHeader entity 30730, one or zero 30748 ReferenceID 30786 for each MessageHeader entity 30730, and one 30756 CreationDateTime 30754 for each MessageHeader entity 30730.

The MessageHeader entity 30730 also includes a SenderParty entity 30762 and a RecipientParty entity 30726A. The SenderParty entity 30762 is of type AGDT 30766 BusinessDocumentMessageHeaderParty 30768. The RecipientParty entity 30726A is also of type AGDT 30730A BusinessDocumentMessageHeaderParty 30732A. There is one or zero 30764 SenderParty entity 30762 for each MessageHeader entity 30730, and there is any number 30728A of RecipientParty entity 30726A for each MessageHeader entity 30730.

The SenderParty entity 30762 includes an InternalID 30770, a StandardID 30778, and a Contact 30786. The InternalID 30770 has zero or one occurrences 30772 for each SenderParty entity 30762 and a data type CDT 30774 of PartyInternalID 30776. The StandardID 30778 has any number of occurrences 30780 for each SenderParty entity 30762 and a data type of CDT 30782 PartyStandardID 30784. The Contact 30786 has zero or one occurrences 30788 for each SenderParty entity 30762 and is of data type GDT 30790 ContactPerson 30792. The Contact 30786 also includes an InternalID 30794, BuyerID 30702A, Bidder ID 30710A and an Address 30718A. The InternalID 30794 Person has any number of occurrences 30796 for each SenderParty entity 30762 and a data type of CDT 30798 ContactPersonInternalID 30700A. The BuyerID 30702A has zero or one occurrences 30704A for each SenderParty entity 30762 and a data type of CDT 30706 ContactPersonPartyID 30708A. The BidderID 30710A has zero or one occurrences 30712A for each SenderParty entity 30714A and a data type of CDT 30714A ContactPersonPartyID 30716A. The Address 30718A has zero or one occurrences 30720A for each SenderParty entity 30762 and a data type of AGDT 30722A Address 30724A.

The RFQCancellation package 30728 includes an RFQCancellation entity 30734A. The RFQCancellation entity 30734A is of type GDT 30738A RFQCancellation 30740A. There is one 30736A RFQCancellation entity 30734A for each RFQCancellationMessage entity 30720. The RFQCancellation entity 30734A includes an ID 30742A. There is one 30744A ID 30742A for each RFQCancellation entity 30734A. The ID 30742A is of type GDT 30746A BusinessTransactionDocumentID 30748A.

(c) Data Type Quote Message

FIGS. 308A-M depict the element structure for QuoteNotification. The element structure is similar to the data model, but provides additional information regarding the details of the interface. The element structure identifies the different packages 30800 in the interface, and represents the entities at various levels within the interface. As depicted in FIGS. 308A-M, the interface for QuoteNotification includes six levels 30802, 30804, 30806, 30808, 30810, and 30812. The element structure identifies the cardinality 30814 between the entities and/or attributes of the interface, and provides information (i.e., type 30816 and name 30818) regarding the data type that provides the basis for the entity and/or attribute. The outermost package of this interface is an QuoteMessage package 30800, which includes an QuoteMessage entity 30822 at the first level 30802. The QuoteMessage entity 30822 is of type message data type ("MDT") 30824 "QuoteMessage" 30826.

The QuoteMessage package 30820 includes a MessageHeader package 30828 and a Quote package 30830. The MessageHeader package 30828 includes a MessageHeader entity 30832, which is of type generic data type ("AGDT") 30836 "BusinessDocumentMessageHeader" 30838. There is one 30834 MessageHeader entity 30832 for each QuoteMessage entity 30822.

The MessageHeader entity 30832 includes an ID 30840, a Reference ID 30848, and a CreationDateTime 30856. The ID 30840 is of type GDT 30844 BusinessDocumentMessageID 30846. The ReferenceID 30848 is of type GDT 30852 BusinessDocumentMessageID 30854. The CreationDateTime 30856 is of type GDT 30860 DateTime 30862. There is one 30842 ID 30840 for each MessageHeader entity 30832, one or zero 30850 ReferenceID 30848 for each MessageHeader entity 30832, and one 30858 CreationDateTime 30856 for each MessageHeader entity 30832.

The MessageHeader entity 30832 also includes a SenderParty entity 30864 and a RecipientParty entity 30828A. The SenderParty entity 30864 is of type AGDT 30868 BusinessDocumentMessageHeaderParty 30870. The RecipientParty entity 30828A is also of type AGDT 30832A BusinessDocumentMessageHeaderParty 30834A. There is one or zero 30866 SenderParty entity 30864 for each MessageHeader entity 30832, and there is any number 30830A of RecipientParty entity 30828A for each MessageHeader entity 30832.

The SenderParty entity 30864 includes an InternalID 30872, a StandardID 30880, and a Contact 30888. The InternalID 30872 has zero or one occurrences 30874 for each SenderParty entity 30864 and a data type CDT 30876 of PartyInternalID 30878. The StandardID 30880 has any number of occurrences 30882 for each SenderParty entity 30864 and a data type of CDT 30884 PartyStandardID 30856. The Contact 30888 has zero or one occurrences 30890 SenderParty entity 30864 and is of data type GDT 30892 Contact 30894. The Contact 30888 also includes an InternalID 30896, BuyerID 30804A, Bidder ID 30812A and an Address 30820A. The InternalID 30896 has any number of occurrences 30898 for each Contact 30888 and a data type of CDT 30800A ContactPersonInternalID 30802A. The BuyerID 30804A has zero or one occurrences 30806A for each Contact 30888 and a data type of CDT 30808A ContactPersonPartyID 30810A. The BidderID 30812A has zero or one occurrences 30814A and a data type of CDT 30816A ContactPersonPartyID 30818A. The Address 30820A has one or zero occurrences 30822A for each Contact 30888 and a data type of AGDT 30824A Address 30826A.

The Quote package 30830 includes a Quote entity 30836A. There is one 30838A Quote entity 30836A for each QuoteMessage entity 30822. The Quote entity 30836A has a data type of AGDT 30840A Quote 30842A. The Quote entity 30836A includes an ID 30844A, a PostingDateTime 30852A, a LastChangeDateTime 30860A, a BindingDateTime 30868A, a Note 30876A, and a ContractTargetAmount 30884A.

There is one 30846A ID 30844A for each Quote entity 30836A. The ID 30844A is of type GDT 30848A BusinessTransactionDocumentID 30850A. A PostingDateTime 30852A has zero or one occurrences 30854A for each Quote entity 30836A and is of type GDT 30856A DateTime 30858A. LastChangeDateTime 30860A has zero or one occurrences 30862A for each Quote entity 30836A and is of type GDT 30864A DateTime 30866A. BindingDateTime 30868A has zero or one occurrences 30870A for each Quote entity 30836A and is of type GDT 30880A DateTime 30874A. Note 30876A has zero or one occurrences 30878A for each Quote entity 30836A and is of type GDT 30880A Note 30882A. ContractTargetAmount 30884A has zero or one occurrences 30886A and is of type GDT 30888A Amount 30890A.

The Party package 30892A includes a BuyerParty entity 30810B, a BidderParty entity 30882B, a BidderPortalPartyProvider entity 30890B, a ProductRecipientParty entity 30898B, a VendorParty entity 30806C, a ManufacturerParty entity 30814C, a PayerParty entity 30822C.

The BuyerParty entity 30810B is of type GDT 30814B BusinessTransactionDocumentParty 30816B. There is one or zero 30812B BuyerParty entity 30810B for each Quote entity 30836A. The BidderParty entity 30882B is of type AGDT 30886B BusinessTransactionDocumentParty 30888B. There is zero or one 30884B BidderParty entity 30882B for each Quote entity 30836A. The BidderPortalPartyProvider entity 30890B is of type AGDT 30894B BusinessTransactionDocumentParty 30896B. There is zero or one 30892B BidderPortalPartyProvider entity 30890B for each Quote entity 30836A. The ProductRecipientParty entity 30898B is of type AGDT 30802C BusinessTransactionDocumentParty 30804C. There is one or zero 30800C ProductRecipientParty entity 30898B for each Quote entity 30836A. The VendorParty entity 30806C is of type AGDT 30810C BusinessTransactionDocumentParty 30812C. There is one or zero 30808C VendorParty entity 30806C for each Quote entity 30836A. The ManufacturerParty entity 30814C is of type AGDT 30818C BusinessTransactionDocumentParty 30820C. There is one or zero 30816C ManufacturerParty entity 30814C for each Quote entity 30836A. The PayerParty entity 30822C is of type AGDT 30826C BusinessTransactionDocumentParty 30828C. There is one or zero 30824C PayerParty entity 30822C for each Quote entity 30836A.

The BuyerParty entity 30810B includes a StandardID 30818B, a BuyerID 30826B, a BidderID 30834B, an Address 30842B, and a Contact 30850B. The StandardID 30818B has any number of occurrences 30820 B for each BuyerParty entity 30810B and a data type of CDT 30822B PartyStandardID 30824B. The BuyerID 30826B has zero or one occurrences 30828B for each BuyerParty entity 30810B and a data type of CDT 30830B PartyPartyID 30840B. The BidderID 30834B has zero or one occurrences 30836B for each BuyerParty entity 30810B and a data type of CDT 30838B PartyPartyID 30840B. The Address 30842B has occurrences 30844B for each BuyerParty entity 30810B and a data type of AGDT 30846B Address 30848B. The Contact 30850B has zero or one occurrences 30852B for each BuyerParty entity 30810B and a data type of AGDT 30854B ContactPerson 30856B. The Contact 30850B also includes a BuyerID 30858B, BidderID 30866B and an Address 30874B. The BuyerID 30858B has zero or one occurrences 30860B for each Contact 30850B and a data type of CDT 30862B PartyPartyID 30864B. The BidderID 30866B has zero or one occurrences 30868B for each Contact 30850B and a data type of CDT 30870B PartyPartyID 30872B. The Address 30874B has one or zero occurrences 30876 for each Contact 30850B and a data type of AGDT 30878B Address 30880B.

The Location package 30894A includes a ShipToLocation entity 30830C. The ShipToLocation entity 30830C is of type AGDT 30834C BusinessTransactionDocumentLocation 30836C. There is one or zero 30832C ShipToLocation entity 30830C for each Quote entity 30836A. The ShipToLocation entity 30830C includes a StandardID 30838C, a BuyerID 30846C, a BidderID 30854C, and an Address 30862C. The StandardID 30838C has any number of occurrences 30840C and a data type of CDT 30842C LocationStandardID 30844C. The BuyerID 30846C has zero or one occurrences 30848C for each ShipToLocation entity 30830C and a data type of CDT 30850C LocationPartyID 30852C. The BidderID 30854C has zero or one occurrences 30856C for each ShipToLocation entity 30830C and a data type of CDT 30858C LocationPartyID 30860C. The Address 30862C has zero or one occurrences 30864C for each ShipToLocation entity 30830C and a data type of AGDT 30866C Address 30868C.

The DeliveryInformation package 30896A includes a DeliveryTerms entity 30870C, which is of type AGDT 30874C DeliveryTerms 30876C. There is one or zero 30872C DeliveryTerms entity 30870C for each Quote entity 30836A. The DeliveryTerms entity 30870C includes an Incoterms entity 30878C which is of type GDT 30882C Incoterms 30884C. There is one or zero 308C Incoterms entity 30878C for each DeliveryTerms entity 30870C.

The PaymentInformation package 30898A includes a CashDiscountTerms entity 30886C, which is of type AGDT 30890C CashDiscountTerms 30892C. There is one or zero 30888C CashDiscountTerms entity 30886C for each Quote entity 30836A. The PaymentInformation package 30898A also includes a PaymentForm entity 30814D. There is one or zero 30816D PaymentForm entity 30814D for each Quote entity 30836A. The PaymentForm entity 30814D includes a Code 30818D that is of type GDT 30822D PaymentFormCode 30824D. There is one 30820D Code 30818D for each PaymentForm entity 30814D.

The CashDiscountTerms entity 30886C includes a MaximumCashDiscount 30894C, and a NormalCashDiscount 30862D, and FullPaymentDueDaysValue 30810D. There is one or zero occurrences 30896C of the MaximumCashDiscount entity 30894C is of type GDT 30898C CashDiscount 30800D. There is one or zero occurrences 30896C of the NormalCashDiscount entity 30802D is of type GDT 30806D CashDiscount 30808D. There are one or zero occurrences 30812D of the FullPaymentDueDaysValue entity 30810D for each CashDiscount Terms entity 30886C.

The ProductInformation package 30800B includes a ProductCategory entity 30826D. The ProductCategory entity 30826D is of type GDT 30830D BusinessTransactionDocumentProductCategory 30832D. There is one or zero 30828D ProductCategory entity 30826D for each Quote entity 30836A. The ProductCategory entity 30826D includes a StandardID 30834D, a BuyerID 30840D, and a BidderID 30846D. The StandardID 30834D of has a data type of CDT 30836D ProductCategoryStandardID 30838D. The BuyerID 30840D has a data type of CDT 30842D ProductCategoryPartyID 30844D. The BidderID 30846D has a data type of CDT 30848D ProductCategoryPartyID 30850D.

The BusinessTransactionDocumentReference package 30802B includes a RFQReference entity 30852D. The RFQReference entity 30852D is of type GDT 30856D BusinessTransactionDocumentReference 30858D. There is one or zero 30854D RFQReference entities 30852D for each Quote entity 30836A. The RFQReference entity 30852D includes an ID 30860D, and there is one 30862D ID 30860D RFQReference entity 30852D is of type GDT 30864D BusinessTransactionDocumentID 30866D.

The Attachment package 30804B includes an Attachment entity 30868D, which is of type GDT 30872D Attachment 30874D. There is any number 30870D Attachment entities 30868D for each Quote entity 30836A.

The Description package 30806B includes a Description entity 30876D. The Description entity 30876D is of type GDT 30880D Description 30882D. There is one or zero 30878D Description entities 30876D for each Quote entity 30836A.

The Item package 30808B includes an Item entity 30884D which is of data type AGDT 30888D QuoteItem 30890D. There is any number 30886D of Item entities 30884D for each Quote entity 30836A. The Item entity 30884D includes an ID 30892D, a ContractTargetAmount 30800E, and a HierarchyRelationship 30808E. The ID 30892D is of type GDT 30896D BusinessTransactionDocumentItemID 30898D, and there is one 30894D ID 30892D for each Item entity 30884D. The ContractTargetAmount 30800E is of type GDT 30804E Amount 30806E, and there is one or zero 30802E ContractTargetAmount 30800E for each Item entity 30884D. There is one or zero 30810E HierarchyRelationship 30808E for each Item entity 30884D. The HierarchyRelationship 30808E includes a ParentItemID 30812E, which is of type GDT 30816E BusinessTransactionDocumentItemID 30818E, and a TypeCode 30820E, which is of type GDT 30824E BusinessTransactionDocumentItem-HierarchyRelationshipTypeCode 30826E. There is one 30814E ParentItemID 30812E for each HierarchyRelationship 30808E, and there is one 30822E TypeCode 30820E for each HierarchyRelationship 30808E.

The Item package 30808B also includes a ProductInformation package 30828E, a Party package 30832E, a Location package 30834E, a DeliveryInformation package 30836E, a BusinessTransactionDocumentReference package 30838E, an Attachment package 30840E, a Description package 30842E, and a ScheduleLine package 30844E.

The ProductInformation package 30828E includes a Product entity 30846E and a ProductCategory entity 30800F. The Product entity 30846E is of type BusinessTransactionDocumentProduct 30850E. There is one or zero 30848E Product entity for each Item entity 30884D. The ProductCategory entity 30800F is of type BusinessTransactionDocumentProductCategory 30804F. There is one or zero 30802F ProductCategory entity 30800F for each Item entity 30884D.

The Product entity 30846E includes a StandardID 30852E, a BuyerID 30860E, a BidderID 30868E, an ManufacturerID 30876E, TypeCode 30884E and a Note 30892E. The StandardID 30852E has any number of occurrences 30854E Product entity 30846E and has a data type of CDT 30856E ProductStandardID 30858E. The BuyerID 30860E has zero or one occurrences 30862E for each Product entity 30846E and a data type of CDT 30864E ProductPartyID 30866E. The BidderID 30868E has zero or one occurrences 30870E for each Product entity 30846E and a data type of CDT 30872E ProductPartyID 30874E. The ManufacturerID 30876E has zero or one occurrences 30878E for each Product entity 30846E and a data type of CDT 30880E ProductPartyID 30882E. The TypeCode 30884E has zero or one occurrences 30886E for each Product entity 30846E and a data type of GDT 30888E ProductTypeCode 30890E. The Note 30892E has zero or one occurrences 30894E for each Product entity 30846E and a data type of GDT 30896E Note 30898E.

The ProductCategory entity 30800F includes a StandardID 30806F, a BuyerID 30814F, and a BidderID 30822F. The StandardID 30806F of has any number of occurrences 30808F for each Product entity 30846E and has a data type of CDT 30810F ProductCategoryStandardID 30812F. The BuyerID 30814F has zero or one occurrences 30816 for each Product entity 30846E and a data type of CDT 30818F ProductCategoryPartyID 30820F. The BidderID 30822F has a data type of CDT 30824F ProductCategoryPartyID 30826F.

The PriceInformation package 30830E includes a Price entity 30828F. There is one or zero 30830F Price entity 30828F for each Item entity 30884D. The Price entity 30828F includes a NetUnitPrice 30832F. The NetUnitPrice 30832F is of type AGDT 30836F Price 30838F. There is one or zero 30834F NetUnitPrice 30832F for each Price entity 30828F.

The Party package 30832E includes a BuyerParty entity 30840F, a BidderParty entity 30848F, a ProductRecipientParty entity 30856F, a VendorParty entity 30864F, and a ManufacturerParty entity 30872F.

The BuyerParty entity 30840F is of type AGDT 30844F BusinessTransactionDocumentParty 30846F. There is one or zero 30842F BuyerParty entity 30840F for each Item entity 30884D. The BidderParty entity 30848F is of type AGDT 30852F BusinessTransactionDocumentParty 30854F. There is zero or one 30850F BidderParty entity 30848F for each Item entity 30884D. There is zero or one 30858F ProductRecipientParty entity 30856F for each Item entity 30884D. The ProductRecipientParty entity 30856F is of type AGDT 30860F BusinessTransactionDocumentParty 30862F. The VendorParty entity 30864F is of type AGDT 30868F BusinessTransactionDocumentParty 30870F. There is one or zero 30866F VendorParty entity 30864F for each Item entity 30884D. The ManufacturerParty entity 30872F is of type AGDT 30876F BusinessTransactionDocumentParty 30878F. There is one or zero 30874F ManufacturerParty entity 30872F for each Item entity 30884D.

The Location package 30834E includes a ShipToLocation entity 30880F. The ShipToLocation entity 30880F is of type AGDT 30884F BusinessTransactionDocumentLocation 30886F. There is one or zero 30882F ShipToLocation entity 30880F for each Item entity 30884D. The ShipToLocation entity 30880F includes a StandardID 30888F, a BuyerID 30896F, a BidderID 30896F, and an Address 30812G. The StandardID 30888F has any number of occurrences 30890F for each ShipToLocation 30880F and a data type of CDT 30892F LocationStandardID 30894F. The BuyerID 30896F has zero or one occurrences 30898F for each ShipToLocation entity 30880F and a data type of CDT 30800G LocationPartyID 30802G. The BidderID 30804G has zero or one occurrences 30806G for each ShipToLocation 30880F and a data type of CDT 30808G LocationPartyID 30810G. The Address 30812G has zero or one occurrences 30814G for each ShipToLocation 30880F and a data type of AGDT 30816G Address 30818G.

The DeliveryInformation package 30836E includes a DeliveryTerms entity 30820G, which is of type AGDT 30824G DeliveryTerms 30826G. There is one or zero 30822G DeliveryTerms entity 30820G for each Item entity 30884D. The DeliveryTerms entity 30820G includes a MaximumLeadTimeDuration entity 30828G which is of type GDT 30832G Duration 30834G, and there is one or zero occurrences 30830G for each DeliveryTerms entity 30820G. The DeliveryTerms entity 30820G includes an Incoterms entity 30836G which is of type GDT 30840G Incoterms 30842G. There is one or zero 30838G Incoterms entity 30836 for each DeliveryTerms entity 30820G.

The BusinessTransactionDocumentReference package 30838E includes a RFQReference entity 30844G. The RFQReference entity 30844G is of type GDT 30848G BusinessTransactionDocumentReference 30850G. There is one or zero 30846G RFQReference entities 30844G for each Item entity 30884D. The RFQReference entity 30844G includes an ID 30852G. There is one 30854G ID entity 30852 for each RFQReference entity 30844G is of type GDT 30856G BusinessTransactionDocumentID 30858G. The RFQReference entity 30844G includes an ItemID 30860G. There is any number 30862G of ItemID 30860G the ItemID is of type GDT 30864G BusinessTransactionDocumentItemID 30866G.

The Attachment package 30840E includes an Attachment entity 30868G, which is of type GDT 30872G Attachment 30874G. There is any number 30870G of Attachment entities 30868G for each Item entity 30884D.

The Description package 30842E includes a Description entity 30876G. The Description entity 30876G is of type GDT 30880G Description 30882G. There is one or zero 30878G Description entity 30876G for each Item entity 30884D.

The ScheduleLine package 30844E includes a ScheduleLine entity 30884G having an ID 30892G, DeliveryPeriod 30800H, and Quantity 30808H. The ScheduleLine entity 30884G has zero or one occurrence 30886G for each Item entity 30884D, and a data type AGDT 30888G ItemScheduleLine 30890G. The ID 30892G has one or zero occurrence 30894G for each ScheduleLine entity 30884G and a data type of GDT 30896G BusinessTransactionDocumentItemScheduleLineID 30898G. The DeliveryPeriod 30800H has one occurrence 30802H a data type of AGDT 30804H DateTimePeriod 30806H. The Quantity 30808H has one or zero occurrences 30810H for each ScheduleLine entity 30884G a data type of GDT 30812H Quantity 30814H.

(d) Data Type RFQ Result Message

FIGS. 309A-D depict the element structure for RFQResultNotification. The element structure is similar to the data model, but provides additional information regarding the details of the interface. The element structure identifies the different packages 30900 in the interface, and represents the entities at various levels within the interface. As depicted in FIGS. 309A-D, the interface for RFQResultNotification includes six levels 30902, 30904, 30906, 30908, 30910, and 30912. The element structure identifies the cardinality 30914 between the entities and/or attributes of the interface, and provides information (i.e., type 30916 and name 30918) regarding the data type that provides the basis for the entity and/or attributes. The outermost package of this interface is an RFQResultMessage package 30920, which includes an RFQResultMessage entity 30922 at the first level 30902. The RFQResultMessage entity 30922 is of type message data type ("MDT") 30924 "RFQResultMessage" 30926.

The RFQResultMessage package 30920 includes a MessageHeader package 30928 and an RFQResult package 30930. The MessageHeader package 30928 includes a MessageHeader entity 30932, which is of type generic data type ("AGDT") 30936 "BusinessDocumentMessageHeader" 30938. There is one 30934 MessageHeader entity 30932 for each RFQMessageResult entity 30922.

The MessageHeader entity 30932 includes an ID 30940, a Reference ID 30948, and a CreationDateTime 30956. The ID 30940 is of type GDT 30944 BusinessDocumentMessageID 30946. The ReferenceID 30948 is of type GDT 30952 BusinessDocumentMessageID 30954. The CreationDateTime 30956 is of type GDT 30960 DateTime 30962. There is one 30942 ID 30940 for each MessageHeader entity 30932, one or zero 30950 ReferenceID 30948 for each MessageHeader entity 30932, and one 30958 CreationDateTime 30956 for each MessageHeader entity 30932.

The MessageHeader entity 30932 also includes a SenderParty entity 30964 and a RecipientParty entity 30928A. The SenderParty entity 30964 is of type AGDT 30968 BusinessDocumentMessageHeaderParty 30970. The RecipientParty entity 30928A is also of type AGDT 30932A BusinessDocumentMessageHeaderParty 30934A. There is one or zero 30966 SenderParty entity 30964 for each MessageHeader entity 30932, and there any number 30930A of RecipientParty entity 30928A for each MessageHeader entity 30932.

The SenderParty entity 30964 includes an InternalID 30972, a StandardID 30980 and a Contact 30988. The InternalID 30972 has zero or one occurrences 30974 for each SenderParty entity 30964 and a data type CDT 30976 of PartyInternalID 30978. The StandardID 30980 has any number of occurrences 30982 for each SenderParty 30964 and has a data type of CDT 30984 PartyStandardID 30986. The Contact 30988 has zero or one occurrences 30990 for each SenderParty entity 30964 and is of data type GDT 30992 ContactPerson 30994. The Contact 30988 also includes an InternalID 30996, BuyerID 30904A, BidderID 30912A and an Address 30920A. The InternalID 30996 has any number of occurrences 30998 for each Contact 30988 and a data type of CDT 30900A ContactPersonInternalID 30902A. The BuyerID 30904A has any zero or one occurrences 30906A for each Contact 30988 and a data type of CDT 30908A ContactPersonPartyID 30910A. The BidderID 30912A has zero or one occurrences 30914A for each Contact 30988 and a data type of CDT 30916A ContactPersonPartyID 30918A. The Address 30920A has one or zero occurrences 30922A for each Contact 30988 and a data type of AGDT 30924A Address 30926A.

The RFQResult package 30930 includes a party package 30952A, a description package 30954A, and an Item package 30956A. The RFQResult package 30930 also includes an RFQResult entity 30936A. The RFQResult entity 30936A is of type AGDT 30940A RFQ Result 30942A. There is one 30938A RFQResult entity 30936A for each RFQResultMessage entity 30922. The RFQResult entity 30936A includes an ID 30944A. There is one 30946A ID 30944A for each RFQResult entity 30936A. The ID 30944A is of type GDT 30948A BusinessTransactionDocumentID 30950A.

The Party package 30952A includes a BidderParty entity 30958A. The BidderParty entity 30958A is of type AGDT 30962A BusinessTransactionDocumentParty 30964A. There is zero or one 30960A BidderParty entity 30958A for each RFQResult entity 30936A.

The Description package 30954A includes a Description entity 30966A. The Description entity 30966A is of type GDT 30970A Description 30972A. There is one or zero occurrences 30968A of Description entities 30966A for each RFQResult entity 30936A.

The Item package 30956A includes a BusinessTranslationDocumentReference package 30910B 30910B and a ScheduleLine package 30912B. The Item package 30956A also includes an Item entity 30974A. There is any number 30976A of Item entities 30974A for each RFQResult entity 30936A. The Item entity 30974A includes an ID 30982A and a HierarchyRelationship 30990A. The ID 30982A is of type GDT 30986A BusinessTransactionDocumentItemID 30988A, and there is one 30984A ID 30982A for each Item entity 30974A. There is one or zero 30992A HierarchyRelationship 30990A for each Item entity 30974A. The HierarchyRelationship 30990A includes a ParentItemID 30994A, which is of type GDT 30998A BusinessTransactionDocumentItemID 30900B, and a TypeCode 30902B which is of type GDT 30906B BusinessTransactionDocumentItemHierarchyRelationshipTypeCode 30908B. There is one 30996A ParentItemID 30994A for each HierarchyRelationship 30990A, and there is one 30904B TypeCode 30902B for each HierarchyRelationship 30990A.

The BusinessTransactionDocumentReference package 30910B includes a QuoteReference entity 30914B. The QuoteReference entity 30914B is of type GDT 30918B BusinessTransactionDocumentReference 30920B. There is one or zero 30916B QuoteReference entities 30914B for each Item entity 30974A. The QuoteReference entity 30914B includes an ID 30922B, is one 24B ID 30922B for each QuoteReference entity 30914B is of type GDT 30926B BusinessTransactionDocumentID 30928B. The QuoteReference entity 30914B also includes an ItemID 30930B. There is any number of occurrences 30932B of ItemID entity 30930B for each QuoteReference entity 30914B. The ItemID is of type GDT 30934B BusinessTransactionDocumentItemID 30936B.

The ScheduleLine package 30912B includes a ScheduleLine entity 30938B having an ID 30946B, a DeliveryPeriod 30954B, and a Quantity 30962B. The ScheduleLine entity 30938B has zero or one occurrence 30940B for each Item entity 30974A, and a data type AGDT 30942B RFQResultItemScheduleLine 30944B. The ID 30946B has one or zero occurrence 30948B for each QuoteReference entity 30914B and a data type of GDT 30950B BusinessTransactionDocumentItemScheduleLineID 30952B. The DeliveryPeriod 30954B has one occurrence 30956B for each QuoteReference entity 30914B a data type of AGDT 30958B DateTimePeriod 30960B. The Quantity 30962B has one or zero occurrences 30964B for each QuoteReference entity 30914B a data type of GDT 30966B Quantity 30968B.

f) Catalogue Interfaces

The Catalogue interfaces, such as the CatalogueUpdateNotification interface and the CataloguePublicationRequest interface, allow for the creation of a catalogue from other catalogues and the management of electronic publication or viewing of the catalogue for a company or enterprise. In particular, the CatalogueUpdateNotification interface allows a catalogue to be received from an external source (e.g., a supplier or other external catalogue provider) and loaded into a Catalogue Authoring Tool (CAT). The CatalogueUpdateNotification interface is compatible to other international standardized interfaces such as eCX and BMEcat and may be considered a B2B interface. The CataloguePublicationRequest interface allows the Catalogue Authoring Tool or company-internal authoring environment to publish the catalogue to a Catalogue Search Engine for employees, customers, or other users to access the catalogue in accordance with the CataloguePublicationRequest. In addition, another set of Catalogue interfaces described herein allows for the confirmation of the catalogue transmission to the Catalogue Search Engine and for the catalogue publication by the Catalogue Search Engine. Yet another set of Catalogue interfaces allows for the cancellation of the catalogue transmission to the Catalogue Search Engine and for locking or revoking publication of identified items of the catalogue by the Catalogue Search Engine.

Catalogues may be of interest for various business scenarios, each scenario usually leading to somewhat different types of catalogues and different types of objects described within the catalogues. In accordance with methods and systems consistent with the present invention, Catalogue interfaces are provided for managing the content of catalogues, such as product catalogues used for purchasing or supplier catalogues for selecting and managing suppliers. For example, a company may use catalogues for the procurement of various products for company employees. Employees may enter the procurement portal associated with the Catalogue Search Engine, browse through a catalogue supported by the Catalogue Search Engine, and add selected products to their respective shopping basket. As discussed below, an internal company catalogue produced by the Catalogue Authoring Tool may include items of several supplier catalogues. To produce the internal catalogue, the Catalogue Manager may upload the supplier catalogues into the Catalogue Authoring Tool and build the internal company catalogue using the Catalogue Authoring Tool. The Catalogue Manager, via the Catalogue Authoring Tool, may structure the catalogue into sections and identify which items to include from the supplier catalogues. In addition, the Catalogue Manager, via the Catalogue Authoring Tool, may enrich the internal catalogue data by, for example, adding suitable descriptions, graphics and characteristics in association with a catalogue item before sending a CataloguePublicationRequest to the Catalogue Search Engine to publish the catalogue.

(1) Message Types

There are eight message types in total that are used in order to transmit and maintain catalogues in accordance with the present invention. Methods and systems consistent with the present invention use the package template for Master Data depicted in FIG. 270C to derive the Catalogue interfaces.

(a) Catalogue Update Notification

A CatalogueUpdateNotification message is a notification about a new, changed or deleted catalogue by a Catalogue Provider to an interested party, such as the Catalogue Authoring Tool and the Catalogue Manager. The structure of message type CatalogueUpdateNotification message is generated based on the structure of message data type CatalogueUpdateMessage. A CatalogueUpdateNotification message may be split into several transmission packages.

(b) Catalogue Publication Request

A CataloguePublicationRequest message is the request from the Catalogue Authoring Tool to the Catalogue Search Engine (or publishing system) to publish a new or changed catalogue or to delete an already published catalogue. The structure of message type CataloguePublicationRequest message is generated based on the structure of message data type CataloguePublicationMessage. The CataloguePublicationRequest message may be split into several transmission packages.

(c) Catalogue Publication Transmission Package Notification

A CataloguePublicationTransmissionPackageNotification message is the notification of the Catalogue Search Engine to Catalogue Authoring Tool about a package of a Catalogue publication transmission and information about the reception of the package and the validity of the package's content. The structure of message type CataloguePublicationTransmissionPackageNotification message is generated based on the structure of message data type CataloguePublicationTransmissionPackageMessage.

(d) Catalogue Publication Confirmation

A CataloguePublicationConfirmation message is the confirmation by the Catalogue Search Engine to the Catalogue Authoring Tool whether the publication or deletion of a catalogue identified by a CataloguePublicationRequest message was successful or not. The structure of message type CataloguePublicationConfirmation message is generated based on the structure of message data type CataloguePublicationConfirmationMessage in FIG. 367.

(e) Catalogue Publication Transmission Cancellation Request

A CataloguePublicationTransmissionCancellationRequest message is the request of the Catalogue Authoring Tool to the Catalogue Search Engine to cancel the transmission of a catalogue and to restore an earlier published state (if such exists) of the catalogue. The structure of the CataloguePublicationTransmissionCancellationRequest message is generated based on the structure of message data type CataloguePublicationTransmissionCancellationRequestMessage. In one implementation, the CataloguePublicationTransmissionCancellationRequest message is used to cancel an ongoing publication and not to de-publish an already successfully published catalogue.

(f) Catalogue Publication Transmission Cancellation Confirmation

A CataloguePublicationTransmissionCancellationConfirmation message is the confirmation of Catalogue Search Engine whether the transmission of a catalogue has been cancelled successfully and an earlier published state of this Catalogue (if such exists) has been restored or not. The structure of message type CataloguePublicationTransmissionCancellationConfirmation is generated based on the structure of message data type CataloguePublicationTransmissionCancellationConfirmationMessage.

(g) Catalogue Publication Transmission Item Lock Request

A CataloguePublicationTransmissionItemLockRequest message is the request of Catalogue Authoring Tool to lock identified items of the catalogue included in the catalogue publication transmission. To lock means that if the catalogue is not yet published, the identified items are not published, and if the catalogue is already published, the publication of the identified items is revoked. The structure of message type CataloguePublicationTransmissionItemLockRequest message is generated based on the structure of message data type CataloguePublicationTransmissionItemLockRequestMessage.

(h) Catalogue Publication Transmission Item Lock Confirmation

A CataloguePublicationTransmissionItemLockConfirmation message is the confirmation of the Catalog Search Engine to the Catalog Authoring Tool whether identified items of the catalogue included in the catalog publication transmission are locked or not. The structure of message type CataloguePublicationTransmissionItemLockConfirmation message is generated based on the structure of message data type CataloguePublicationTransmissionItemLockConfirmationMessage.

(2) Message Choreography

Figure 359:
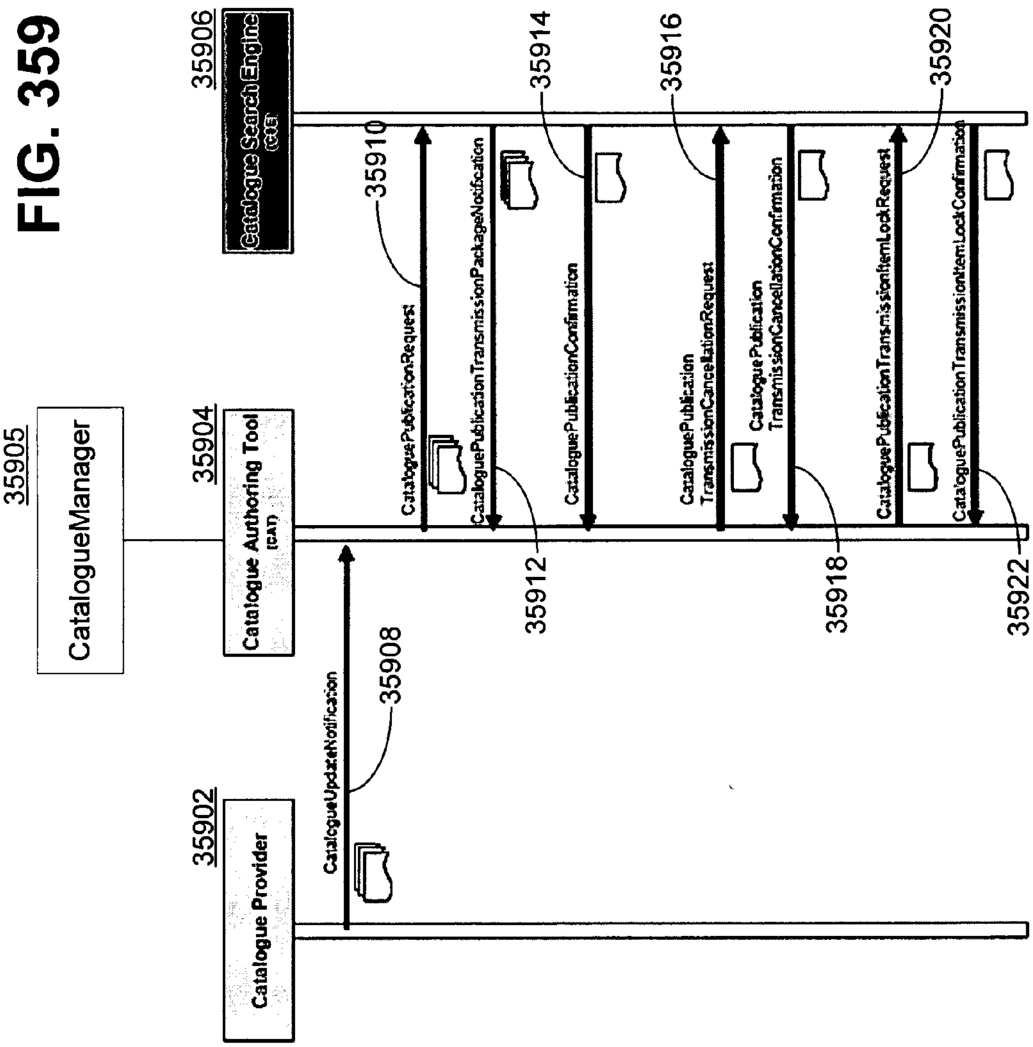
FIG. 359 depicts the message choreography for the Catalogue interfaces in accordance with methods and systems consistent with the present invention.
Figure 360A:
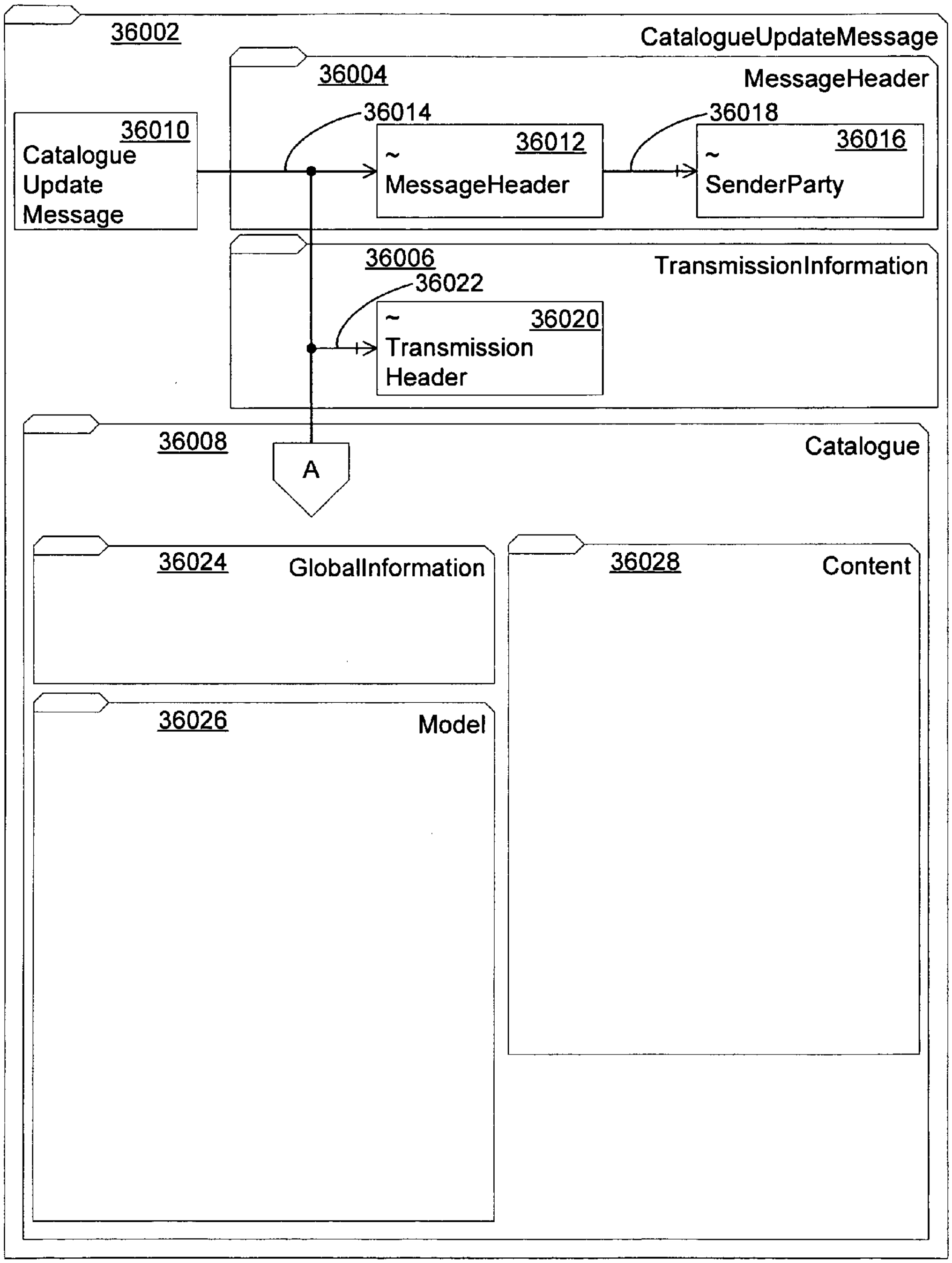
FIG. 360 depicts the data model for the message data type CatalogueUpdateMessage used to implement a CatalogueUpdateNotification.
Figure 360B:
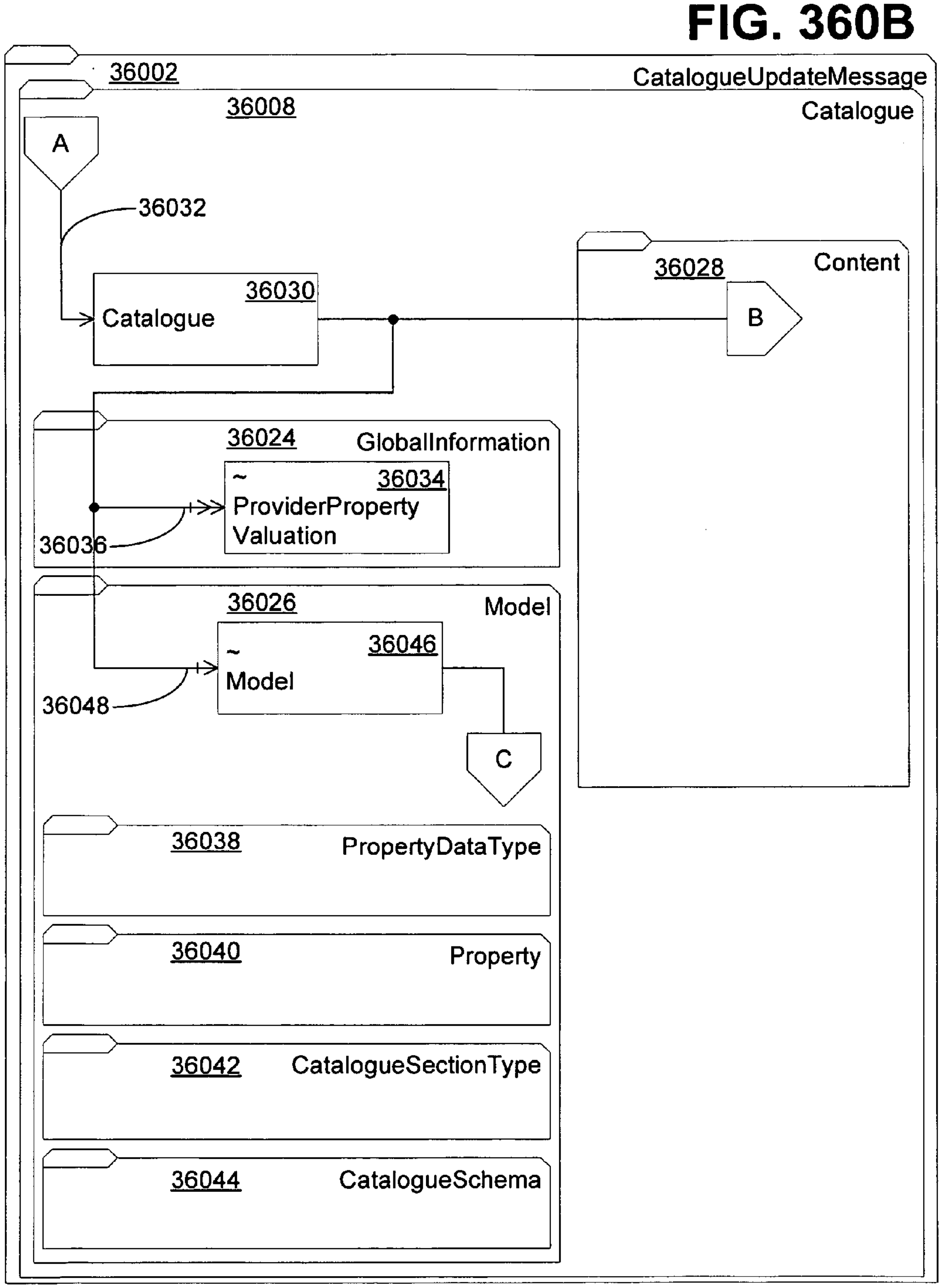
Figure 360C:
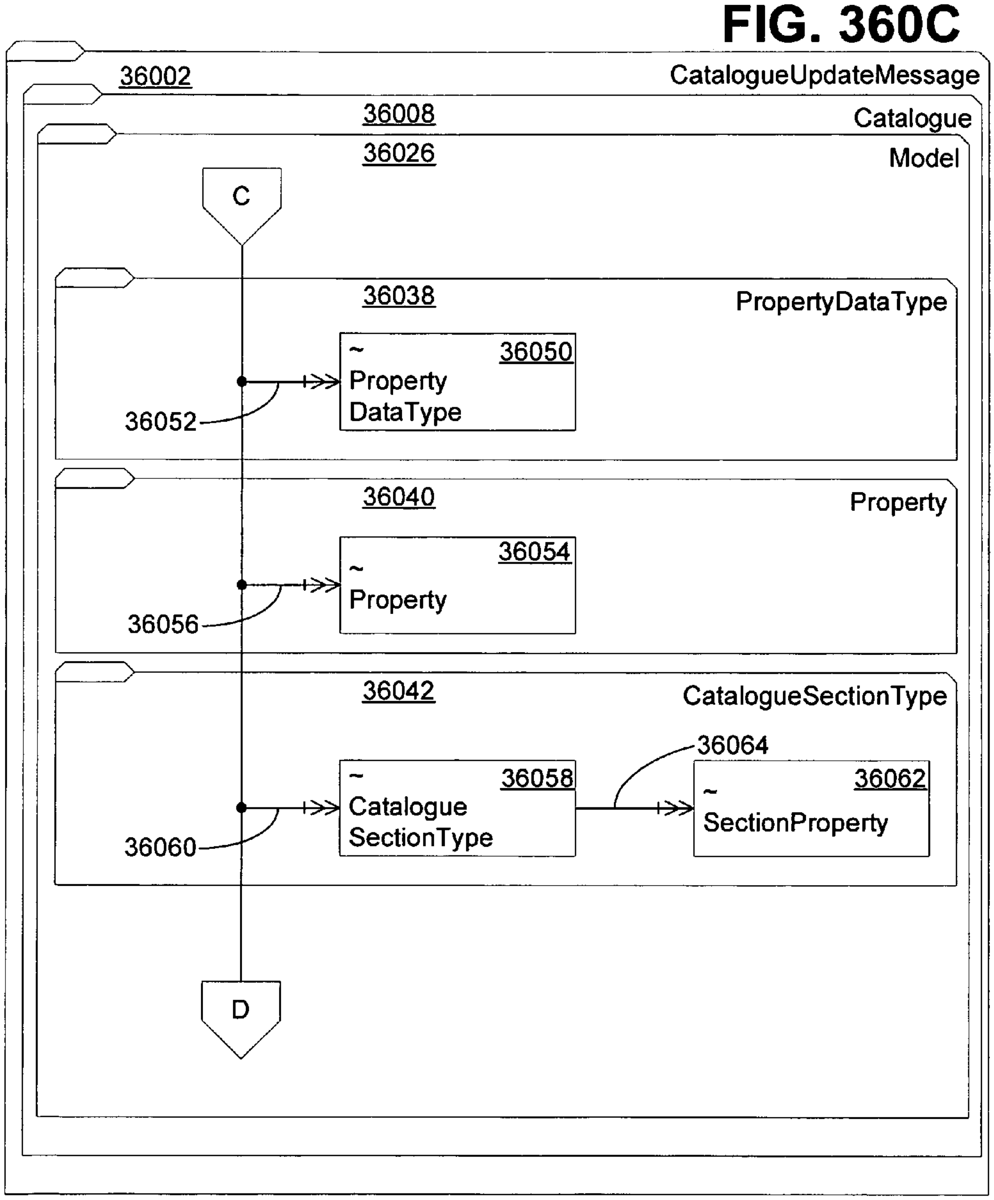
Figure 360D:
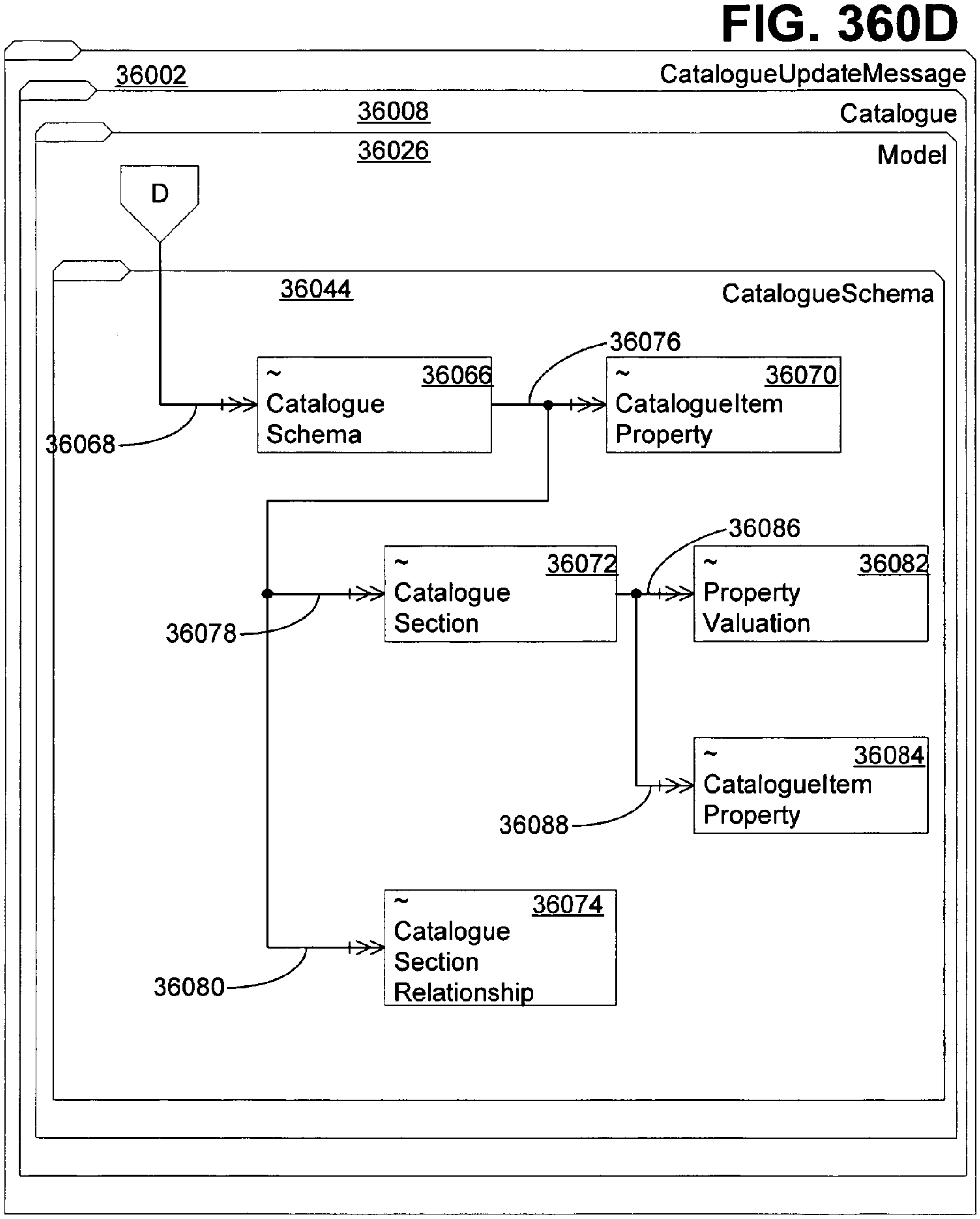
Figure 360E:
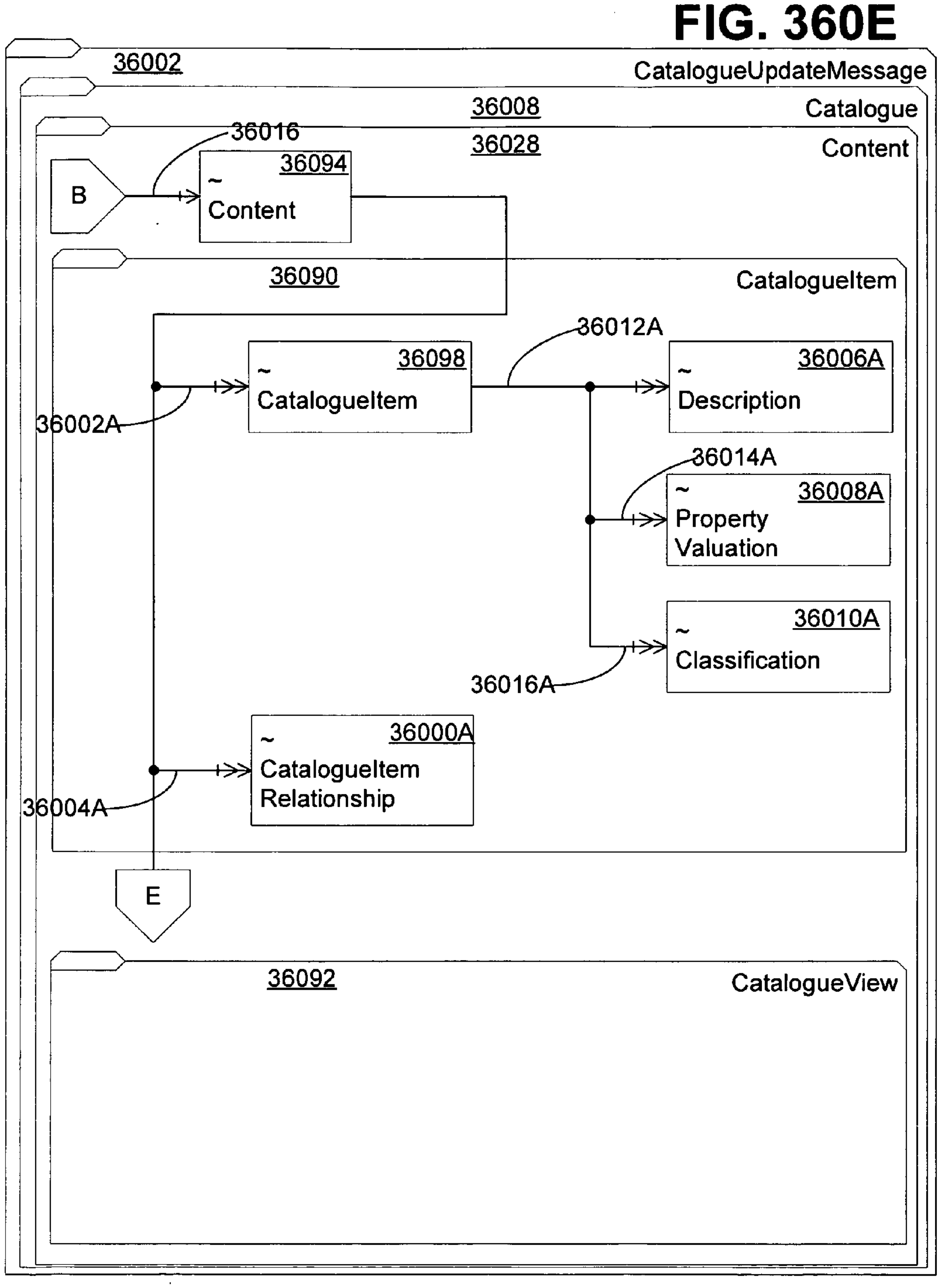
Figure 360F:
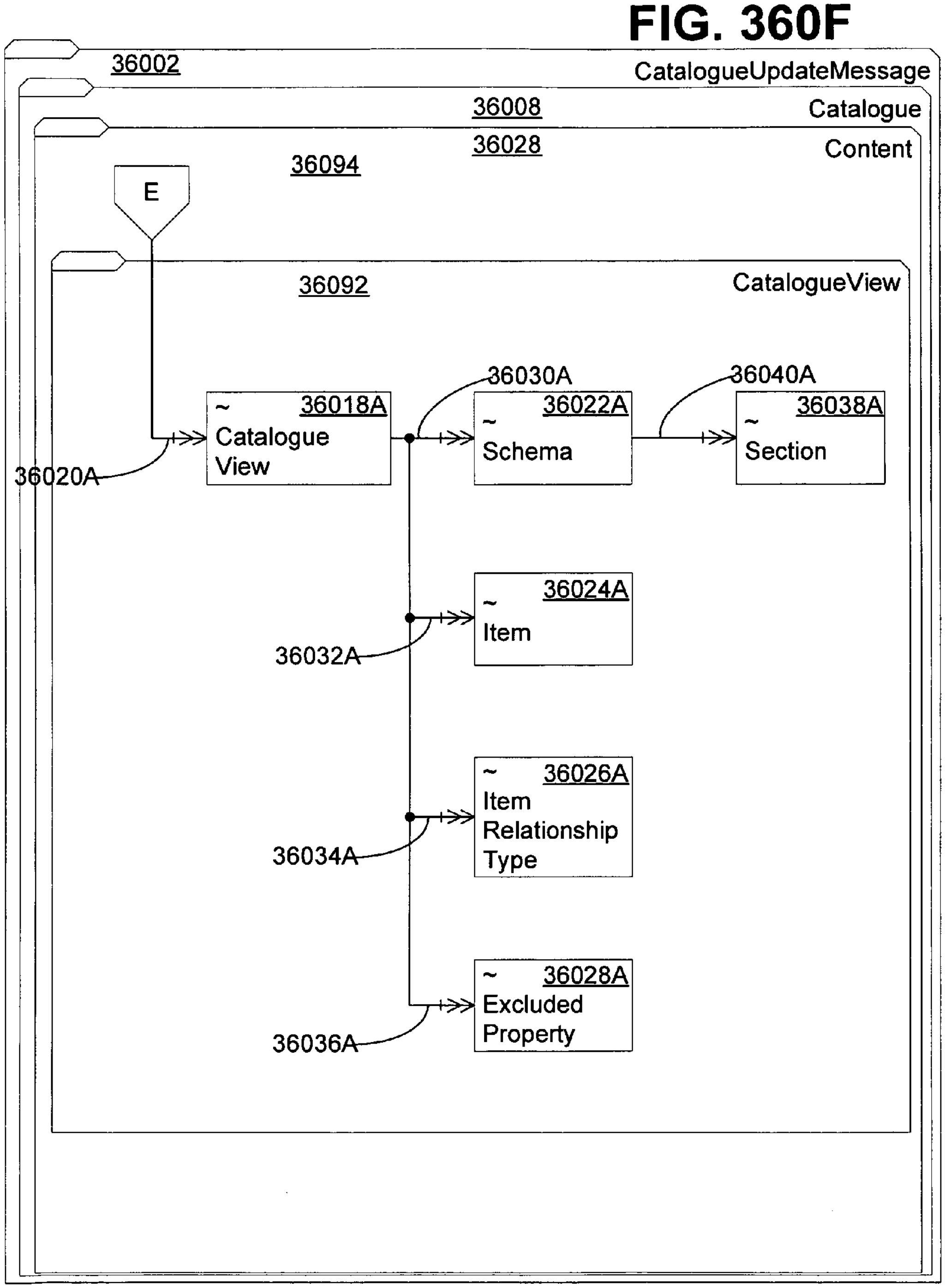
Figure 362A:
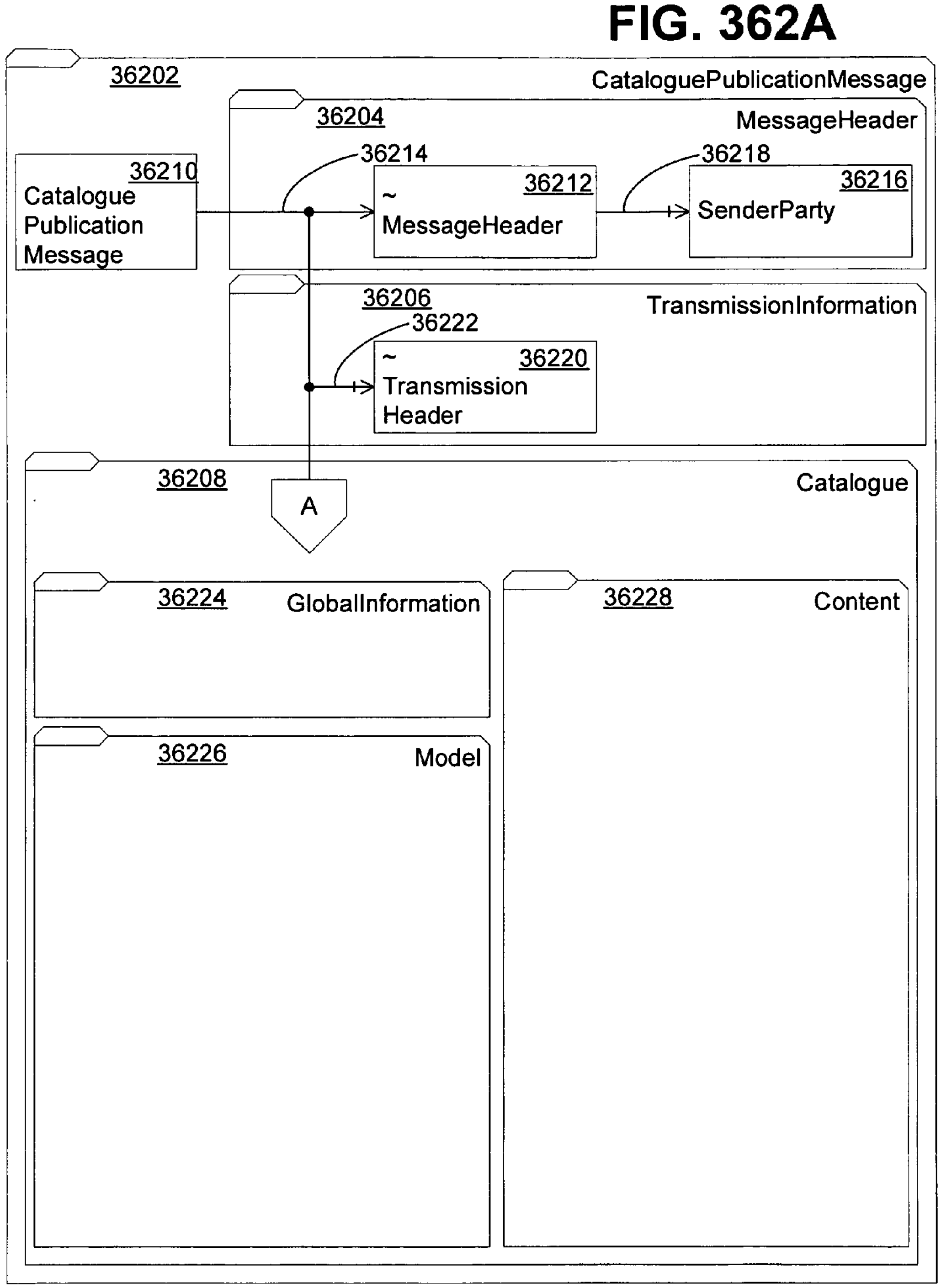
FIG. 362 depicts the data model for the message data type CataloguePublicationMessage used to implement a CataloguePublicationRequest.
Figure 362B:
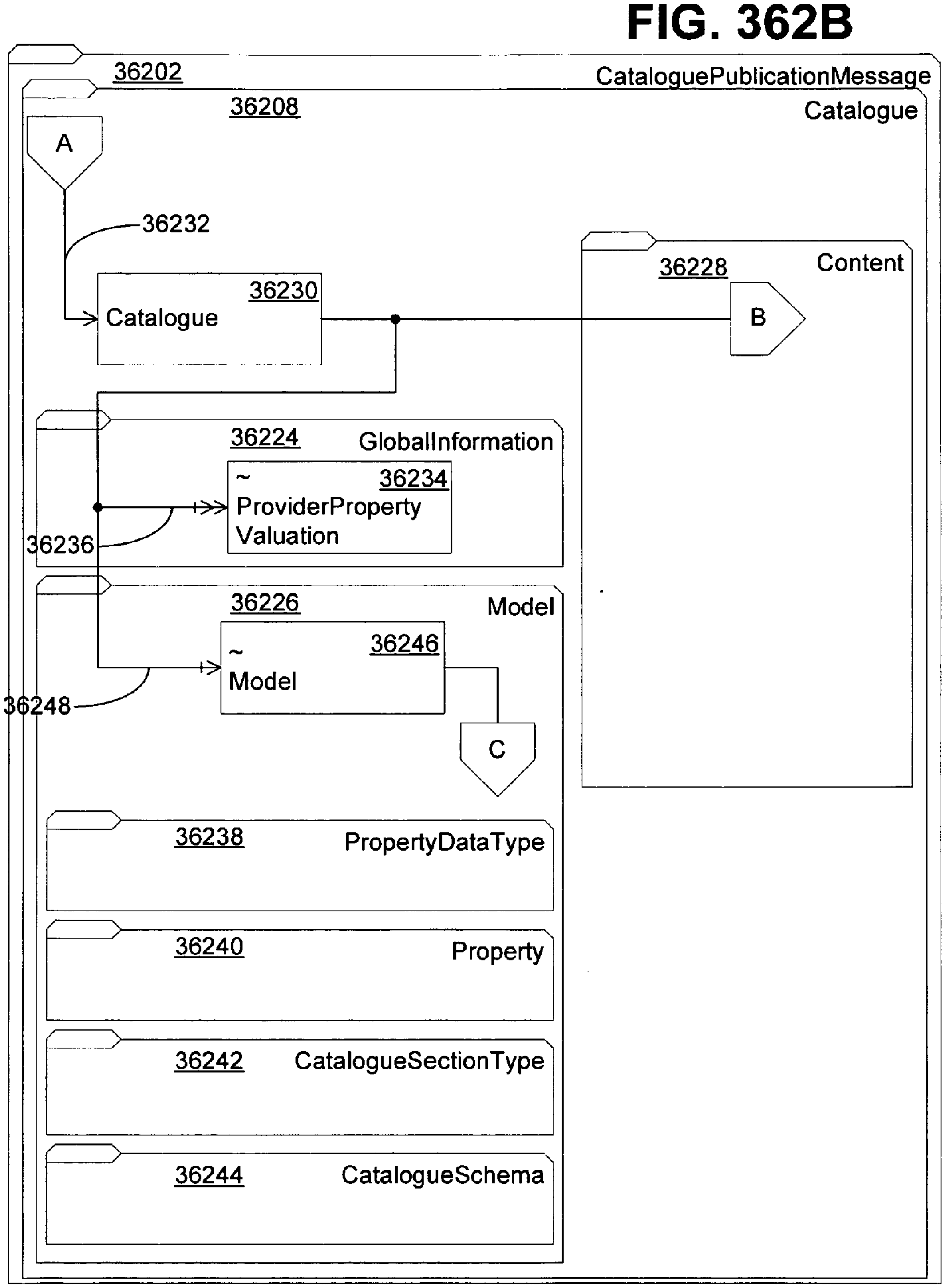
Figure 362C:
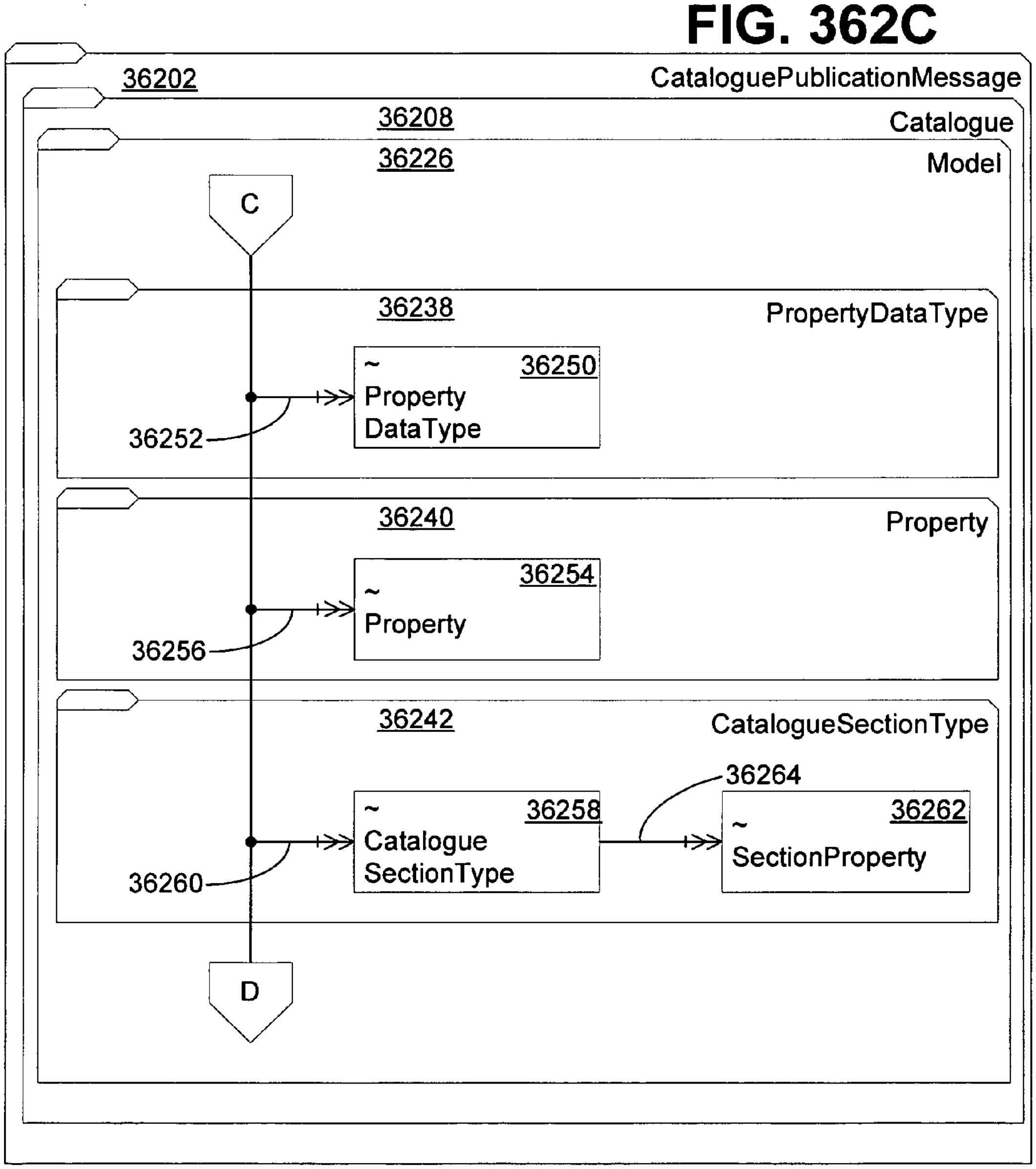
Figure 362D:
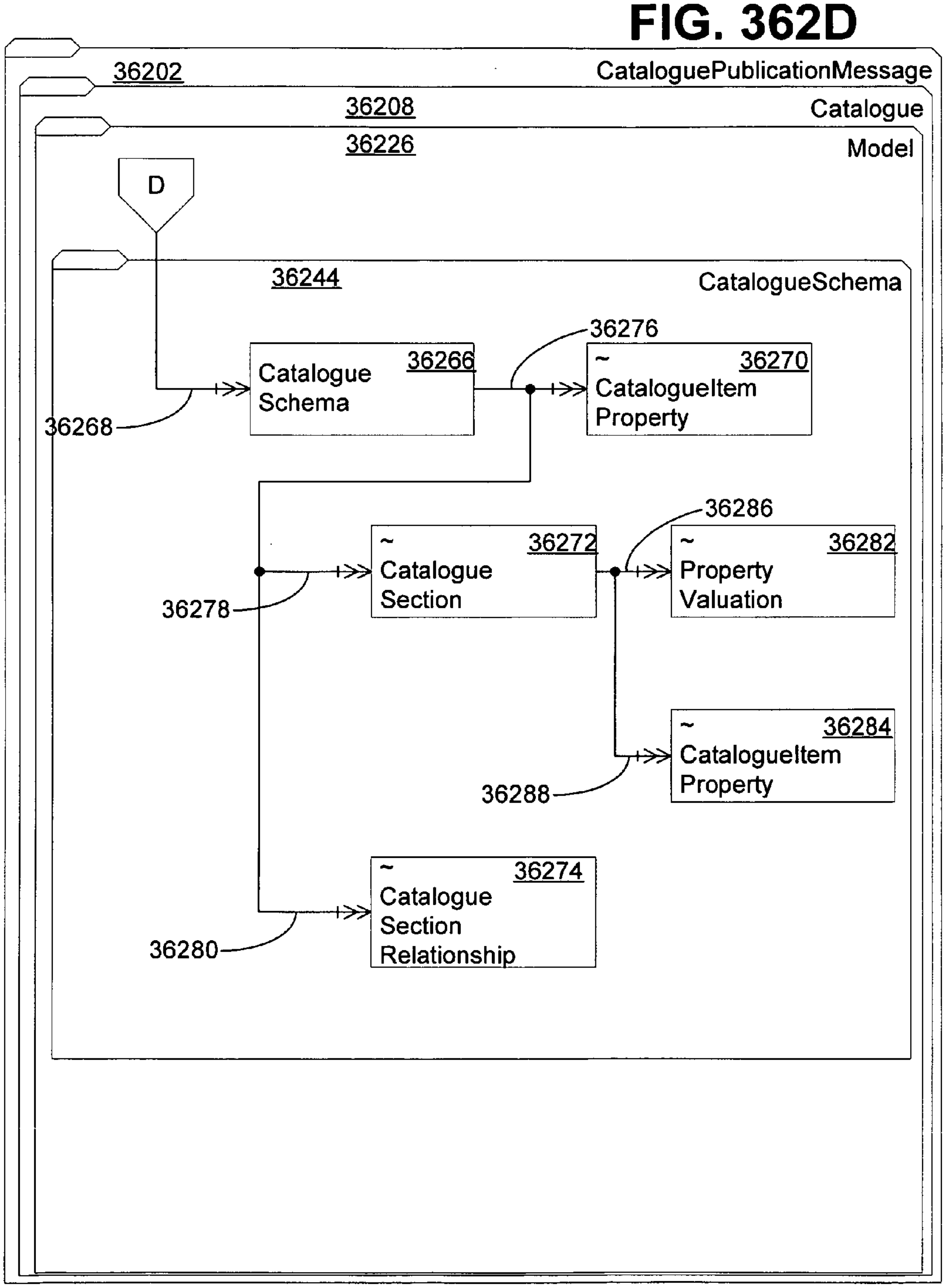
Figure 362E:
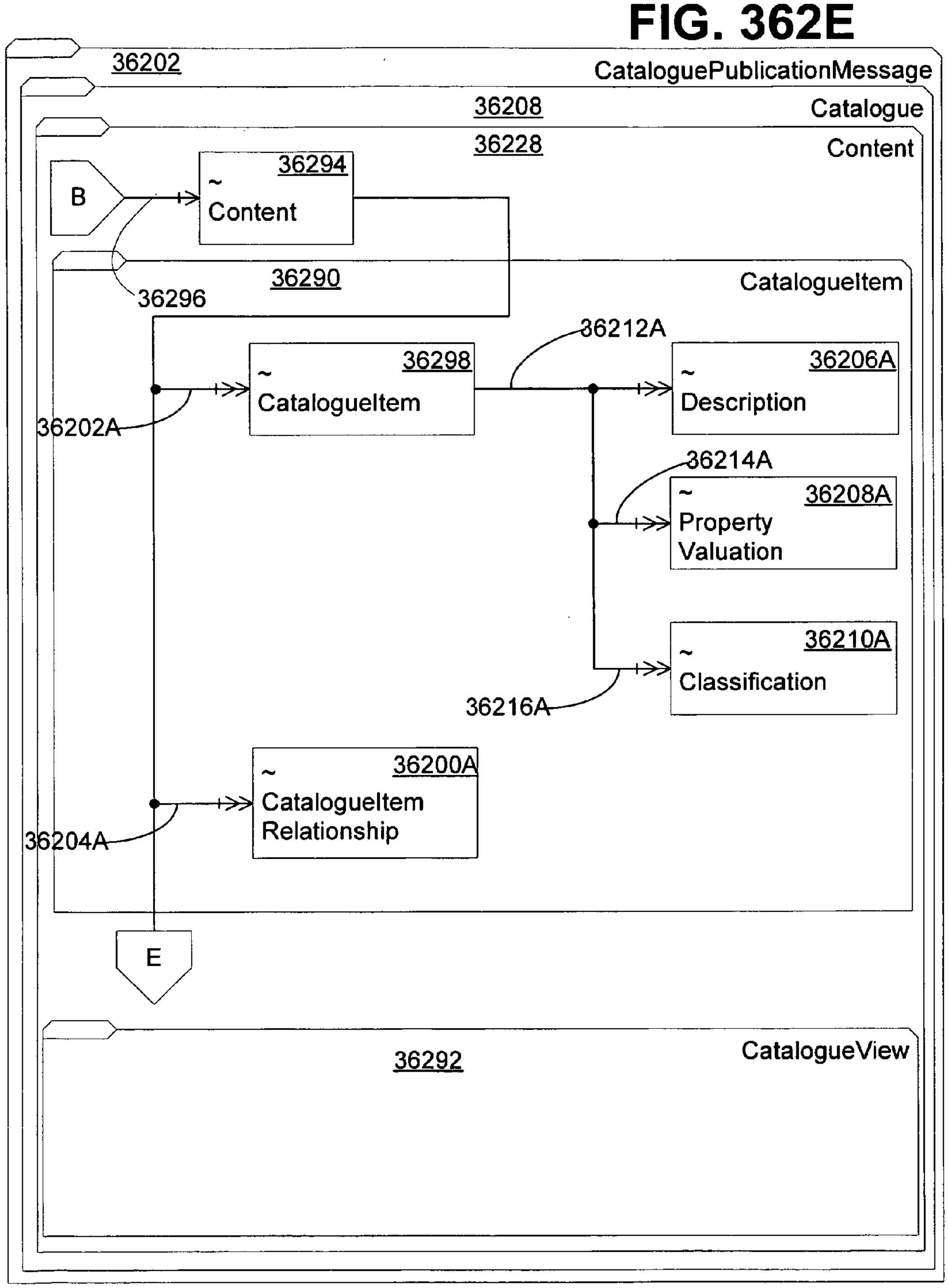
Figure 362F:
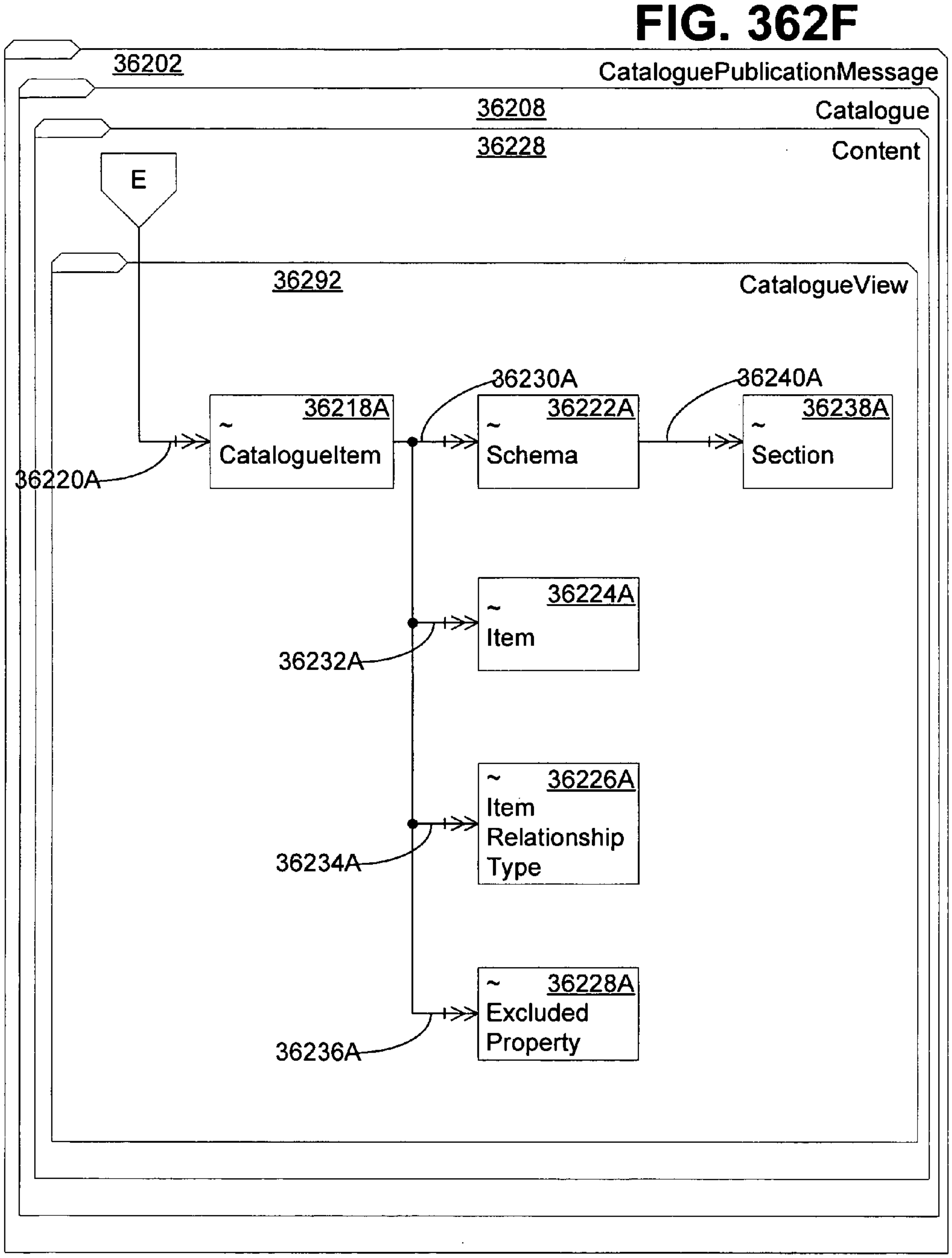

FIG. 359 depicts the message choreography for Catalog Interfaces. The choreography involves three business entities: a Catalogue Provider 35902, a Catalogue Authoring Tool (CAT) 35904, and a Catalogue Search Engine (CSE) 35906. The choreography may also involve a Catalogue Manager 35905 that is able to interface and control the Catalogue Authoring Tool 35904. In one implementation shown in FIG. 359, the Catalogue Provider 35902 (e.g., a supplier or other external source) sends a CatalogueUpdateNotification message 35908 to the Catalogue Authoring Tool 35904 to cause the Catalogue Authoring Tool 35904 to load a catalogue or a portion of a catalogue identified in the CatalogueUpdateNotification message 35908 into the Catalogue Authoring Tool 35904. In another implementation, the Catalogue Manager 35905 via the Catalogue Authoring Tool 35904 uploads external catalogues received from several Catalogue Providers 35902 into the Catalogue Authoring Tool 35904 using one or more CatalogueUpdateNotification messages 35908. The Catalogue Manager 35905 may then build an internal company catalogue using the Catalogue Authoring Tool 35904 and the received external catalogues. After creating the internal company catalogue, the Catalogue manager 35905, via the Catalogue Authoring Tool 35904, triggers the publication of the catalogue by sending a CataloguePublicationRequest message 35910 to the Catalogue Search Engine 35906. A successful publication makes the new version of the catalogue available to catalogue users that may access the Catalogue Search Engine 35906. In response to receiving the CataloguePublicationRequest message 35910, the Catalogue Search Engine 35906 may send a CataloguePublicationTransmissionPackageNotification message 35912 to the Catalogue Authoring Tool 35904 to signal that at least a part of the catalogue transmission associated with the CataloguePublicationRequest message 35910 has been successfully received and data included in the CataloguePublicationRequest message 35910 is valid. The Catalogue Search Engine 35906 may then send a CataloguePublicationConfirmation message 35914 to the Catalogue Authoring Tool 35904 to identify that the complete catalogue associated with the CataloguePublicationRequest message 35910 was successfully published.

If an error has occurred in creating the catalogue, the Catalogue Authoring Tool 35904 is configured to send a CataloguePublicationTransmissionCancellationRequest message 35916 to the Catalogue Search Engine 35906 to cause the Catalogue Search Engine 35906 to cancel the publication of the identified catalogue. In response, the Catalogue Search Engine 35906 is configured to send to Catalogue Authoring Tool 35904 a CataloguePublicationTransmissionCancellationConfirmation message 35918 in order to confirm the cancellation.

As discussed below, the Catalogue Authoring Tool 35904 also allows the Catalogue Manager 35905 to make one or more catalogue items of a transmission invisible to a catalogue user accessing the catalogue via the Catalogue Search Engine 35906. In particular, the Catalogue Manager 35905, via the Catalogue Authoring Tool 35904, may send a CataloguePublicationTransmissionItemLockRequest message 35920 to the Catalogue Search Engine 35906 to cause the Catalogue Search Engine 35906 to lock or revoke publishing a catalogue item identified in the CataloguePublicationTransmissionItemLockRequest message 35920. After performing the process of locking the catalogue item in accordance with the item identified in the CataloguePublicationTransmissionItemLockRequest message 35920, the Catalogue Search Engine 35906 sends a CataloguePublicationTransmissionItemLockConfirmation message 35922 to the Catalogue Authoring Tool 35904.

(3) Message Serialization

All messages may be asynchronous in nature. Request messages may be sent to an Exchange Infrastructure (not shown in FIG. 359) with quality of service EOIO (exactly once, in order) so that the messages of the same type (e.g., CataloguePublicationRequest message 35910) are received in the Catalogue Search Engine 35906 in the order they were sent out of the Catalogue Authoring Tool 35904.

(4) Error Handling

Each response message (e.g., CataloguePublicationTransmissionPackageNotification message) from the Catalogue Search Engine 35906 may include a 'BusinessTransactionCompletedIndicator' which specifies whether the corresponding request message was processed successfully. If the request message was not processed successfully, a 'TransmissionLog' includes information identifying why the message was not processed, i.e. processing errors that occurred. The request messages (e.g., CataloguePublicationRequest message 35912) may specify in 'MinimumRequestedLogItemSeverityCode' what level of information shall be returned by the response messages, i.e. detailed information on successful processing, warnings, application errors, or aborts.

(5) Message Data Type Catalogue Update Message

The data model for the message data type CatalogueUpdateMessage used to implement a CatalogueUpdateNotification 35908 is depicted in FIG. 360. The message data type CatalogueUpdateMessage includes a CatalogueUpdateMessage package 36002. The CatalogueUpdateMessage package 36002 includes a MessageHeader package 36004, a TransmissionInformation package 36006, a Catalogue package 36008, and a CatalogueUpdateMessage entity 36010.

(a) Message Header Package

The MessageHeader package 36004 groups the business-related information relevant for sending a Business Document in a message. The MessageHeader package 36004 includes a MessageHeader entity 36012. There is a 1:1 relationship 36014 between the CatalogueUpdateMessage entity 36010 and the MessageHeader entity 36012. The MessageHeader entity 36012 includes a SenderParty entity 36016. There is a 1:c relationship 36018 between the MessageHeader entity 36012 and the SenderParty entity 36016.

The MessageHeader groups the business-related information from the sending application's point of view for identifying the Business Document in a message, information about the sender, and potentially information about the receiver. The MessageHeader entity 36012 is of type GDT BusinessDocumentMessageHeader.

The SenderParty is the party responsible for sending of a business document on a business-related application level. The SenderParty entity 36016 is of type GDT BusinessDocumentMessageHeaderParty.

(b) Transmission Information Package

The TransmissionInformation package 36006 groups the information pertaining to the transmission of the object or entity (e.g., the CatalogueUpdateMessage entity 36010) included in the message. The TransmissionInformation package 36006 includes a TransmissionHeader entity 36020. There is a 1:c relationship 36022 between the CatalogueUpdateMessage entity 36010 and the TransmissionHeader entity 36020. A TransmissionHeader entity 36020 provides information about the identification of a transmission (and one or more of the TransmissionHeader entity's packages). Additionally the minimum requested severity of events occurring during the processing of the transmission which have to be logged and returned may be specified. The TransmissionHeader entity 36020 includes an ID, a PackageOrdinalNumberValue, a PackageTotalNumberValue, and a MinimumRequestedLogItemSeverityCode.

The ID is a unique identification number grouping several data packages into one Catalogue transmission, and is of type GDT Transmission ID. The PackageOrdinalNumberValue specifies the sequence number identifying a data package in a multiple data package transmission, and is of type GDT OrdinalNumberValue. The PackageTotalNumberValue specifies the total number of data packages making up a Catalogue transmission, and is of type GDT TotalNumberValue. The MinimumRequestedLogItemSeverityCode specifies the severity of log items to be returned by messages CataloguePublicationTransmissionPackageNotification and CataloguePublicationConfirmation, and is of type GDT LogItemSeverityCode.

Catalogues often contain such a large amount of data that they may not be exchanged in one single message. Large catalogues are therefore split into smaller part messages (e.g., CatalogueUpdateNotification messages) each of which is transmitted separately.

(c) Catalogue Package

The Catalogue package 36008 groups the information necessary to describe the structure and content of a Catalogue. The Catalogue package 36008 includes a GlobalInformation package 36024, a CatalogueModel ("Model") package 36026, a CatalogueContent ("Content") package 36028, and a Catalogue entity 36030. There is a 1:1 relationship 36032 between the CatalogueUpdateMessage entity 36010 and the Catalogue entity 36030.

(i) Catalogue Entity

The Catalogue entity 36030 may correspond to a new, changed or deleted Catalogue. A Catalogue entity 36030 is a structured directory of Catalogue items. Each item represents an object, and provides information about the object. The Catalogue entity 36030 references global information (e.g., as implemented in the GlobalInformation package), model information (e.g., as implemented in the CatalogueModel package) and content information (e.g., as implemented in the GlobalInformation package). The global information provides information relevant to the entire Catalogue. The model information defines the structure of the Catalogue content and the properties used to describe this content. Content information includes the items of the Catalogue and each of the items structural assignment within the Catalogue structure.

The Catalogue entity 36030 may include the following elements or attributes:

1) @LanguageCode, which specifies the language for a description or name associated with the Catalogue. The @LanguageCode is of type GDT:LanguageCode.

2) @currencyCode, which specifies the currency in an element Amount. The @currencyCode is of type GDT:CurrencyCode.

3) @unitCode, which specifies the unit code in an element Quantity. The @unitCode is of type GDT:MeasureUnitCode 4) @actionCode, which specifies the operation to be performed on the complete catalogue. The @actionCode is of type GDT:ActionCode.

5) ID, which identifies the Catalogue being transmitted. The ID is of type GDT:CatalogueID.

6) VersionID, which identifies the version of the Catalogue being transmitted. The VersionID is of type GDT:VersionID.

7) Name, which identifies a name for the entire Catalogue in a language identified by @LanguageCode. The Name is of type GDT:Name.

8) TypeCode, which specifies the type of Catalogue being transmitted. For example, TypeCode may indicate the type as a supplier catalogue or purchasing catalogue. The TypeCode is of type GDT:CatalogueTypeCode.

9) ValidityPeriod, which specifies the period during which the Catalogue is valid. The ValidityPeriod is of type GDT: DateTimePeriod.

For example, the Catalogue may be a products or parts Catalogue that corresponds to a directory of objects of type "product" providing information about products. In this example, the Catalogue facilitates finding products matching certain criteria specified by an actor (e.g., a catalogue user) and that may then be used in an associated business process. The business process may be for example "procurement," in which case the Catalogue is a "purchasing catalogue" or a "spare parts catalogue," or "sales catalogue." In case of a "sales catalogue," information from the Catalogue may be provided such that the products seem especially appealing to the target group the Catalogue addresses. Alternatively, the Catalogue may correspond to a supplier directory of objects of type "supplier" used in a procurement process.

(ii) Catalogue Global Information Package

The GlobalInformation package 36024 groups the information relevant to the entire catalogue. The GlobalInformation package 36024 includes a ProviderPropertyValuation entity 36034. There is a 1:cn relationship 36036 between the Catalogue entity 36030 and the ProviderPropertyValuation entity 36034.

The ProviderPropertyValuation valuates properties provided by the Catalogue provider to provide additional information about the Catalogue (e.g., any information about the vendor/s, Catalogue creation date, or Notes). The ProviderPropertyValuation entity 36034 is of type GDT:PropertyValuation, and uses PropertyReference and PropertyValue elements. The PropertyReference specifies the property that is being valuated. The PropertyReference is of type GDT: PropertyReference. The PropertyValue specifies the value of the property. The PropertyValue is of type GDT PropertyValue. As further discussed below, the PropertyValue includes the following elements: AmountSpecification, QuantitySpecification, DecimalSpecification, FloatSpecification, IntegerSpecification, DateTimeSpecification, NameSpecification, and IndicatorSpecification.

(iii) Catalogue Model Package

The CatalogueModel package 36026 includes a PropertyDataType package 36038, a Property package 36040, a CatalogueSectionType package 36042, a CatalogueSchema package 36044, and CatalogueModel entity 36046. There is a 1:c relationship 36048 between the Catalogue entity 36030 and the CatalogueModel entity 36046.

a) Catalogue Model

The CatalogueModel describes and structures the Catalogue content using systems of categories to group Catalogue items and properties that may be attributed to the Catalogue items or the categories themselves or both. The CatalogueModel entity 36046 identifies information regarding how the Catalogue content is structured and defined. The Catalogue Model entity 36046 defines properties, the data types of the properties, and allowed values, which are used to describe catalogue sections and/or the items included in the Catalogue as identified in associated PropertyDataType package 36038 and Property package 36040. Additionally, the Catalogue Model entity 36046 specifies one or more schemas as identified in associated CatalogueSchema package 36044, which defines the structural composition of the Catalogue content by means of sections and relationships between these sections. The sections of a schema correspond to divided up Catalogue items and include properties used to describe the Catalogue items assigned to the respective schema section. The CatalogueModel entity 36046 may have multiple schemas. The CatalogueModel entity 36046 includes a PropertyDataTypeListCompleteTransmissionIndicator, a PropertyListCompleteTransmissionIndicator, a CatalogueSectionTypeListCompleteTransmissionIndicator, and a CatalogueSchemaListCompleteTransmissionIndicator. The PropertyDataTypeListCompleteTransmissionIndicator specifies whether the list of PropertyDataTypes has been transmitted completely. The PropertyDataTypeListCompleteTransmissionIndicator is of type GDT:CompleteTransmissionIndicator. The PropertyListCompleteTransmissionIndicator specifies whether the list of Properties has been transmitted completely. The PropertyListCompleteTransmissionIndicator is of type GDT: CompleteTransmissionIndicator. The CatalogueSectionTypeListCompleteTransmissionIndicator specifies whether the list of SectionTypes has been transmitted completely. The CatalogueSectionTypeListCompleteTransmissionIndicator is of type GDT:CompleteTransmissionIndicator. The CatalogueSchemaListCompleteTransmissionIndicator specifies whether the list of Schemas has been transmitted completely. The CatalogueSchemaListCompleteTransmissionIndicator is of type GDT: CompleteTransmissionIndicator.

(b) Catalogue Model Property Data Type Package

The PropertyDataType package 36038 groups the information pertaining to property data types. The PropertyDataType package 36038 includes a PropertyDataType entity 36050. The PropertyDataType defines the data type of properties used in the Catalogue to describe Catalogue sections and Catalogue items. The PropertyDataType entity 36050 is of type GDT PropertyDataType. There is a 1:cn relationship 36052 between the CatalogueModel entity 36046 and the PropertyDataType entity 36050.

The PropertyDataType entity 36050 includes an @actionCode, which specifies the operation to be performed on the Property, an ID, a PreferredName, a FormatCode, a MaximumTotalDigitNumberValue, and a FractionalDigitNumberValue. In one implementation, the PropertyDataType entity 36050 also includes a ComponentProperty that has a Reference with PropertyID and an OrdinalNumberValue. The PropertyDataType entity 36050 may also include an AllowedPropertyValueElement that has a PropertyValue.

(c) Catalogue Model Property Package

The Property package 36040 groups the information pertaining to properties used in the catalogue. The Property package 36040 includes a Property entity 36054. There is a 1:cn relationship 36056 between the CatalogueModel entity 36046 and the PropertyDataType entity 36054.

The Property specifies a property and additional information for it that may be used to describe and differentiate between items included or sections used within the catalogue. The Property entity 36054 is of type GDT Property, and includes the following elements: an @actioncode; an ID; a PreferredName; a PropertyDataTypeReference; an AspectID, which identifies an aspect in which the Property is used; a TargetInterfaceElementID, which identifies an element of an interface the Property may be mapped to; a MultipleValueIndicator, which indicates whether the Property may contain multiple values; a TextSearchableIndicator, which indicates whether the Property is qualified for "Text Search"; a ParametricSearchableIndicator, which indicates whether the Property is qualified for "Parametric Search"; and a ValuationRequiredIndicator, which indicates whether a valuation is mandatory on the object which includes this Property. The @actionCode specifies the operation to be performed on the Property.

(d) Catalogue Model Section Type Package

The CatalogueModelSectionType or CatalogueSectionType package 36042 groups the information necessary to define a section type. The CatalogueSectionType package 36042 includes a CatalogueSectionType entity 36058. The CatalogueSectionType entity 36058 describes the nature of Catalogue sections by defining properties for the description of sections of this type. There is a 1:cn relationship 36060 between the CatalogueModel entity 36046 and the CatalogueSectionType entity 36058. A CatalogueSectionType entity 36058 may include one or more SectionProperty entities 36062 each of which describes a respective Catalogue section of the CatalogueSectionType entity 36058. Thus, there is a 1:cn relationship 36064 between the CatalogueSectionType entity 36058 and each Property entity 36062.

The CatalogueSectionType entity 36058 includes the following elements: an @actionCode, an ID, and a Name. The @actionCode is of type GDT:Action Code and specifies the operation to be performed on the CatalogueSectionType. The ID is of type GDT: SectionTypeID and identifies the CatalogueSectionType. The Name is of type GDT:Name and provides a name for the CatalogueSection type in a language identified by @LanguageCode of the Catalogue.

The SectionProperty specifies a property pertaining to a Section type together with its position in the list of properties. This property should be attributed to the sections of this Section type. The SectionProperty entity 36062 includes a PropertyReference and a OrdinalNumberValue. The PropertyReference is of type GDT:PropertyReference and includes an ID that identifies the property. The OrdinalNumberValue is of type GDT:OrdinalNumberValue and provides the information about the place in the list of SectionProperty entities 36062.

(e) Catalogue Model Schema Package

The CatalogueModelSchema or CatalogueSchema package 36044 groups the information pertaining to a Catalogue schema. It includes a CatalogueSchema entity 36066. The CatalogueSchema entity 36066 defines a structural composition of the Catalogue content in accordance with a predetermined purpose. There is a 1:cn relationship 36068 between the CatalogueModel entity 36046 and the CatalogueSchema entity 36066. The CatalogueSchema entity 36066 may include one or more CatalogueItemProperty entities 36070, each of which describes a respective Catalogue item of the CatalogueSchema entity 36066. In addition, the CatalogueSchema entity 36066 also may include one or more CatalogueSection entities 36072 and one or more CatalogueSectionRelationship entities 36074. There is a 1:cn relationship 36076 between the CatalogueSchema entity 36066 and the CatalogueItemProperty entity 36070. There is a 1:cn relationship 36078 between the CatalogueSchema entity 36066 and the CatalogueSection entity 36072. There is a 1:cn relationship 36080 between the CatalogueSchema entity 36066 and the CatalogueSectionRelationship entity 36074.

The CatalogueSchema entity 36066 includes an @actionCode, an ID, a TypeCode, a Name, a SectionListCompleteTransmissionIndicator, and a SectionRelationshipListCompleteTransmissionIndicator. The @actionCode is of type GDT: ActionCode and specifies the operation to be performed on the CatalogueSchema entity 36066. The ID is of type GDT: CatalogueSchemaID and identifies the CatalogueSchema entity 36066. The TypeCode is of type GDT:CatalogueSchemaTypeCode and specifies the nature of the catalogue schema. The Name is of type GDT: Name and provides a name for a schema in a language identified by @LanguageCode of the Catalogue. The SectionListCompleteTransmissionIndicator is of type GDT:CompleteTransmissionIndicator and specifies whether the list of sections has been transmitted completely. The SectionRelationshipListCompleteTransmissionIndicator is of type GDT:CompleteTransmissionIndicator and specifies whether the list of SectionRelationships has been transmitted completely. The CatalogueSchema supports a specific business process or addresses a specific target group. Thus, the CatalogueSchema may include multiple schemas.

(i) Catalogue Item Property

The CatalogueItemProperty entity 36070 specifies a property pertaining to a catalogue item and the CatalogueItemProperty's 36070 position in the list of properties attributed to the catalogue item. The CatalogueItemProperty entity 36070 includes a PropertyReference of type GDT:PropertyReference and an OrdinalNumberValue of type GDT: OrdinalNumberValue. The PropertyReference has an ID that identifies the property associated with the catalogue item. The OrdinalNumberValue specifies the CatalogueItemProperty's position in the list of properties attributed to the catalogue item.

(ii) Catalogue Section

Each CatalogueSection entity 36072 corresponds to a respective set of catalogue items in accordance with the CatalogueSchema 36066. Each CatalogueSection entity 36072 specifies properties which may be used to describe the set of catalogue items. Each CatalogueSection entity 36072 may include one more PropertyValuation entities 36082 and one or more CatalogueItemProperty entities 36084. Thus, there is a 1:cn relationship 36086 between the CatalogueSection entity 36072 and the PropertyValuation entity 36082. There is also a 1:cn relationship 36088 between the CatalogueSection entity 36072 and the CatalogueItemProperty entity 36084.

Each CatalogueSection entity 36072 may also include an @actionCode, an ID, a TypeID, and a Name. The @actionCode is of type GDT:ActionCode and specifies the operation to be performed on the respective CatalogueSection entity 36072. The ID is of type GDT:CatalogueSectionID and identifies respective CatalogueSection entity 36072. The TypeID is of type GDT:CatalogueSectionTypeID and identifies a Section type to which the respective CatalogueSection entity 36072 belongs. The Name is of type GDT:Name and provides a name for the respective CatalogueSection entity 36072 in a language identified by @LanguageCode of the Catalogue entity 36030.

(iii) Catalogue Section Property Valuation

Each Property Valuation or CatalogueSectionPropertyValuation entity 36082 includes the value of a property that may be attributed to or is used to describe the CatalogueSection entity 36072 in accordance with a CatalogueSection type. The CatalogueSectionPropertyValuation entity 36082 is of type GDT PropertyValuation and has a PropertyReference of type GDT:PropertyReference and a PropertyValue of type GDT:PropertyValue. The PropertyReference references a valuated property defined in the CatalogueSectionType corresponding to the CatalogueSection.

(iv) Catalogue Section Catalogue Item Property

Each CatalogueItemProperty or CatalogueSectionCatalogueItemProperty entity 36084 specifies a property pertaining to the catalogue items or objects associated with the respective CatalogueSection. The CatalogueSectionCatalogueItemProperty entity 36084 also specifies the property's position in the full list of properties attributed to a catalogue item. The CatalogueSectionCatalogueItemProperty entity 36084 includes a PropertyReference of type GDT: PropertyReference and an OrdinalNumberValue of type GDT:OrdinalNumberValue. Each CatalogueSectionCatalogueItemProperty entity 36084 refers to a property defined as part of the CatalogueModel and may not be attributed to the catalogue items within the Catalogue.

(v) Catalogue Section Relationship

Each CatalogueSectionRelationship entity 36074 specifies a connection between two CatalogueSection entities 36072 within a CatalogueSchema entity 36066. In one implementation, each CatalogueSectionRelationship entity 36074 corresponds to a parent-child connection between two CatalogueSection entities 36072, providing a hierarchical structure to the Catalogue entity 36030. The CatalogueSectionRelationship entity 36074 includes an @actionCode, a SourceCatalogueSectionID, and a TargetCatalogueSectionID. The @actionCode is of type GDT:ActionCode and specifies the operation to be performed on the corresponding CatalogueSectionRelationship entity 36074. The SourceCatalogueSectionID is of type GDT:CatalogueSectionID and identifies a source CatalogueSection entity 36072. The TargetCatalogueSectionID is of type GDT:CatalogueSectionID and identifies a target CatalogueSection entity 36072.

(iv) Catalogue Content Package

The Content or CatalogueContent package 36028 includes a CatalogueItem package 36090, a CatalogueView package 36092, and a CatalogueContent entity 36094. There is a 1:c relationship 36096 between the Catalogue entity 36030 and the CatalogueContent entity 36094. The CatalogueContent entity 36094 specifies the list of business objects included in the catalogue reflected by the Catalogue entity 36030, together with their relationships and descriptions according to the catalogue's schemas reflected by the CatalogueSchema entity 36066, and the views (e.g., CatalogueView) that are used to restrict the catalogue's information content for certain purposes. The CatalogueContent entity 36094 also specifies the items (e.g., CatalogueItem) included in the Catalogue entity 36030 and each item's classification or assignment to Catalogue sections reflected by the one or more CatalogueSection entities 36072. The CatalogueContent entity 36094 includes a CatalogueItemListCompleteTransmissionIndicator, a CatalogueItemRelationshipListCompleteTransmissionIndicator, a CatalogueViewListCompleteTransmissionIndicator, and a CatalogueSchemaID. The CatalogueItemListCompleteTransmissionIndicator is of type GDT:CompleteTransmissionIndicator and specifies whether the list of items (e.g., CatalogueItem entities 36098) has been transmitted completely. The CatalogueItemRelationshipListCompleteTransmissionIndicator is of type GDT: CompleteTransmissionIndicator and specifies whether the list of ItemRelationships (e.g., CatalogueItemRelationship entities 36000A) has been transmitted completely. The CatalogueViewListCompleteTransmissionIndicator is of type GDT:CompleteTransmissionIndicator and specifies whether the list of Views (e.g., CatalogueView entities 36018A) has been transmitted completely. The CatalogueSchemaID identifies a catalogue schema (e.g., a CatalogueSchema entity 36072) to which the respective CatalogueContent entity 36094 is assigned. In one implementation, The CatalogueSchemaID of a first of the CatalogueContent entities 36094 functions as a default value for remaining CatalogueContent entities 36094 without a specified CatalogueSchemaID.

(a) Catalogue Content Catalogue Item Package

The CatalogueItem package 36090 groups the information pertaining to catalogue items. The CatalogueItem package 36090 includes a CatalogueItem entity 36098 and a CatalogueItemRelationship entity 36000A. There is a 1:cn relationship 36002A between the CatalogueContent entity 36094 and the CatalogueItem entity 36098. There is a 1:cn relationship 36004A between the CatalogueContent entity 36094 and the CatalogueItemRelationship entity 36000A.

(i) Catalogue Item

The CatalogueItem entity 36098 specifies information about an object included and to be classified within the Catalogue entity 36030 in accordance with the Catalogue entity's 36030 schema as reflected by the CatalogueSchema entity 36066. The CatalogueItem entity 36098 includes a CatalogueItemDescription entity 36006A that describes the item reflected by the CatalogueItem entity 36098. The CatalogueItem entity 36098 may also include a CatalogueItemPropertyValuation entity 36008A and a CatalogueItemClassification entity 36010A. The CatalogueItem entity 36098 may further include an @actionCode and an ID. The @actionCode is of type GDT:ActionCode and specifies the operation to be performed on the item. The ID is of type GDT:CatalogueItemID and identifies the respective CatalogueItem entity 36098.

(ii) Catalogue Item Description

The CatalogueItemDescription entity 36006A is of type GDT:Description and provides a description for an item in a specified language. There is a 1:cn relationship 36012A between the CatalogueItem entity 36098 and the CatalogueItemDescription entity 36006A.

(iii) Catalogue Item Classification

The CatalogueItemClassification entity 36010A assigns the CatalogueItem entity 36098 to a respective CatalogueSection entity 36072 within one of the CatalogueSchema entities 36066 associated with the Catalogue entity 36030. The CatalogueItemClassification entity 36010A includes a SchemaID and a SectionID. The SchemaID is of type GDT: CatalogueSchemaID and identifies the schema (e.g., one of the CatalogueSchema entities 36066) that the CatalogueItem entity 36098 references. The SectionID is of type GDT: CatalogueSectionID and identifies the section (e.g., one of the CatalogueSection entities 36072) that the CatalogueItem entity 36098 references. There is a 1:cn relationship 36016A between the CatalogueItem entity 36098 and the CatalogueItemClassification entity 36006A.

(iv) Catalogue Item Property Valuation

The CatalogueItemPropertyValuation entity 36008A is of type GDT: PropertyValuation and specifies the value of a property that may be attributed to the object the CatalogueItem entity 36098 represents in accordance with one of the CatalogueSchema entities 36066. The CatalogueItemPropertyValuation entity 36008A includes a PropertyReference and a PropertyValue. The PropertyReference is of type GDT:PropertyReference and is the reference to the property to be valuated for the CatalogueItem entity 36098. The PropertyValue is of type GDT: PropertyValue and is the value of the property reflected by the PropertyReference. There is a 1:cn relationship 36014A between the CatalogueItem entity 36098 and the CatalogueItemPropertyValuation entity 36008A.

(v) Catalogue Item Relationship

The CatalogueItemRelationship entity 36000A specifies a relationship with certain semantics between any two CatalogueItem entities 36098. The CatalogueItemRelationship entity 36000A includes an @actionCode, a SourceCatalogueItemID, a TargetCatalogueItemID, and a TypeCode. The @actionCode is of type GDT:ActionCode and specifies the operation to be performed on the relationship between the two CatalogueItem entities 36098. The SourceCatalogueItemID is of type GDT:CatalogueItemID and identifies the source CatalogueItem entity 36098. The TargetCatalogueItemID is of type GDT:CatalogueItemID and identifies the target CatalogueItem entity 36098. The TypeCode is of type GDT:ObjectStructureRelationshipTypeCode and specifies the semantics of the relationship existing between the source CatalogueItem entity 36098 and the target CatalogueItem entity 36098.

(b) Catalogue Content Catalogue View Package

The CatalogueView package 36092 groups the information pertaining to Catalogue views. The CatalogueView package 36092 includes a CatalogueView entity 3601 8A. There is a 1:cn relationship 36020A between the CatalogueContent entity 36094 and the CatalogueView entity 36018A.

(i) Catalogue View

The CatalogueView entity 36018A defines a subset of a Catalogue by specifying schemas, sections, Catalogue items and item relationship types to be included and properties to be excluded from a catalogue view. The CatalogueView entity 36018A may include a CatalogueViewSchema entity 36022A, a CatalogueViewItem entity 36024A and a CatalogueViewItemRelationshipType entity 36026A. In addition, the CatalogueView entity 36018A may include a CatalogueViewExcludedProperty entity 36028A, which specifies properties not to be included in the view. The CatalogueView entity 36018A includes an @actionCode, an ID, a Name, an ItemListCompleteTransmissionIndicator, an ItemRelationshipTypeListCompleteTransmissionIndicator, and an ExcludedPropertyListCompleteTransmissionIndicator. The @actionCode is of type GDT:ActionCode and specifies the operation to be performed on the CatalogueView entity 36018A. The ID is of type GDT:CatalogueViewID and identifies a view ID. The Name is of type GDT:Name and provides a name for the view in various languages. The ItemListCompleteTransmissionIndicator is of type GDT:CompleteTransmissionIndicator and specifies whether the item list has been transmitted completely. The ItemRelationshipTypeListCompleteTransmissionIndicator is of type GDT:CompleteTransmissionIndicator and specifies whether the list of item relationships has been transmitted completely. The ExcludedPropertyListCompleteTransmissionIndicator is of type GDT:CompleteTransmissionIndicator and specifies whether the list of excluded properties has been transmitted completely. There is a 1:cn relationship 36030A between the CatalogueView entity 36018A and the CatalogueViewSchema entity 36022A. There is a 1:cn relationship 36032A between the CatalogueView entity 36018A and the CatalogueViewItem entity 36024A. There is a 1:cn relationship 36034A between the CatalogueView entity 36018A and the CatalogueViewItemRelationshipType entity 36026A. There is a 1:cn relationship 36036A between the CatalogueView entity 36018A and the CatalogueViewExcludedProperty entity 36026A.

(ii) Catalogue View Schema

The CatalogueViewSchema entity 36022A specifies a schema and a list of sections belonging to the schema that are to be included in a CatalogueView entity 36018A. The CatalogueViewSchema entity 36022A is subdivided into one or more CatalogueViewSchemaSection entities 36038A that specify Sections included in the CatalogueView entity 36018A. There is a 1:cn relationship 36040A between the CatalogueViewSchema entity 36022A and the CatalogueViewSchemaSection entity 36038A. The CatalogueViewSchema entity 36022A includes an ID and a SectionListCompleteTransmissionIndicator. The ID is of type GDT: CatalogueSchemaID and identifies the respective CatalogueViewSchema entity 36022A. The SectionListCompleteTransmissionIndicator is of type GDT:CompleteTransmissionIndicator and specifies whether the list of sections (e.g., one or more CatalogueViewSchemaSections) has been transmitted completely.

(iii) Catalogue View Schema Section

The CatalogueViewSchemaSection entity 36022 specifies a section of the referenced catalogue schema (e.g., CatalogueViewSchema entity 36022A) to be included in the catalogue view. The CatalogueViewSchemaSection entity 36022 includes an @actionCode is of type GDT:ActionCode and an ID is of type GDT:CatalogueSectionID. The @actionCode specifies the operation to be performed on the CatalogueViewSchemaSection entity 36022 identified by the ID.

(iv) Catalogue View Item

The CatalogueViewItem entity 36024A specifies a CatalogueItem entity 36098 to be included in the catalogue view. The CatalogueViewItem entity 36024A includes an @actionCode of type GDT:ActionCode and an ID of type GDT: CatalogueItemID. The @actionCode specifies the operation to be performed on the CatalogueViewItem entity 36024A identified by the ID.

(v) Catalogue View Item Relationship Type

The CatalogueViewItemRelationshipType entity 36026A specifies a catalogue item relationship type. In one implementation, the catalogue item relationships of the CatalogueViewItemRelationshipType entity 36026A are included in the catalogue view. CatalogueViewItemRelationshipType entity 36026A includes an @actionCode of type GDT:ActionCode and a Code of type GDT:ObjectStructureRelationshipType Code. The @actionCode specifies the operation to be performed on the item relationship type identified by the Code.

(vi) Catalogue View Excluded Property

The CatalogueViewExcludedProperty 36028A specifies a property that is not included in the catalogue view. For example, a CatalogueViewExcludedProperty "Price" is defined in the CatalogueContent entity 36094 means that users that have access to the content of the respective catalogue reflected by the Catalogue entity 36030 may not see the price of catalogue items (e.g., CatalogueItem entities 36098) of the catalogue. The CatalogueViewExcludedProperty 36028A includes an @actionCode of type GDT:ActionCode and a PropertyReference of type GDT: PropertyReference. The @actionCode specifies the operation to be performed on an excluded property identified by the PropertyReference.

(d) Message Data Type—Data Model (e) Message Data Type—Element Structure

FIGS. 361A-AA depict the element structure for a CatalogueUpdateNotification message 3598. The element structure is similar to the above described data model of the message data type CatalogueUpdateMessage as reflected in FIG. 360, but provides additional information regarding the details for interfacing with or implementing a CatalogueUpdateMessage, such as a CatalogueUpdateNotification message 3598. As shown in FIG. 361A, the element structure identifies the different packages 36100 that may be in a respective CatalogueUpdateNotification message 3598. The element structure for the CatalogueUpdateNotification message 35908 includes eight levels 36102, 36104, 36106, 36108, 36110, 36112, 36114 and 36116 each of associated with a respective package 36100. The element structure identifies the cardinality 36118 and data type information (i.e., type 36120 and name 36122) for the elements at the respective levels 36102, 36104, 36106, 36108, 36110, 36112, 36114, and 36116.

The outermost package of this interface is a CatalogueUpdateNotification package 36124, which includes a CatalogueUpdateMessage entity 36126 at the first level 36102. The CatalogueUpdateMessage entity 36026 is of generic data type ("GDT") 36128 CatalogueUpdateMessage 36130.

The CatalogueUpdateNotification package 36124 includes a MessageHeader package 36132, a TransmissionInformation package 36134, and a Catalogue package 36136. The MessageHeader package 36132 includes a MessageHeader entity 36140, which is of type GDT 36144 BusinessDocumentMessageHeader 36146. There is one 36142 MessageHeader entity 36140 for each CatalogueUpdateMessage entity 36026.

The MessageHeader entity 36140 includes an ID 36150 and a CreationDateTime 36158. The ID 36150 is of type GDT 36154 BusinessDocumentMessageID 36156. The CreationDateTime 36158 is of type GDT 36162 DateTime 36164. There is one 36152 ID 36150 for each MessageHeader entity 36140 and one 36160 CreationDateTime 36158 for each MessageHeader entity 36140.

The MessageHeader entity 36140 also includes a SenderParty entity 36166. The SenderParty entity 36166 is of type GDT 36170 BusinessDocumentMessageHeaderParty 36172. There is one or zero 36168 SenderParty entity 36166 for each MessageHeader entity 36140.

The TransmissionInformation package 36134 includes a TransmissionHeader entity 36174. The TransmissionHeader entity 36174 is of type GDT 36178 BusinessDocumentTransmissionHeader 36180. There is one or zero 36176 TransmissionHeader entity 36174 for each CatalogueUpdateMessage entity 36026. The TransmissionHeader entity 36174 includes an ID 36182, a PackageOrdinalNumberValue 36190, a PackageTotalNumberValue 36198, and a MinimumRequestedLogItemSeverityCode 36174A. The ID 36182 is of type GDT 36186 TransmissionID 36188. The PackageOrdinalNumber- Value 36190 is of type GDT 36194 OrdinalNumberValue 36196. The PackageTotalNumberValue 36198 is of type GDT 36102A TotalNumberValue 36104A. The MinimumRequestedLogItemSeverityCode 36174A is of type GDT 36110A LogItemSeverityCode 36112A. There is one 36184 ID 36182 for each TransmissionHeader entity 36174. There is one 36192 PackageOrdinalNumberValue 36190 for each TransmissionHeader entity 36174. There is one or zero 36100A PackageTotalNumberValue 36198 for each TransmissionHeader entity 36174. There is one or zero 36108A MinimumRequestedLogItemSeverityCode 36174A for each TransmissionHeader entity 36174.

The Catalogue package 36136 includes a Catalogue entity 36114A. The Catalogue entity 36014A is of type GDT 36118A Transmission Catalogue 36120A. There is one 36116A Catalogue entity 36014A for each CatalogueUpdateMessage entity 36026. Catalogue entity 36014A includes an @LanguageCode 36122A, an @currencyCode 36130A, an @unitCode 36138A, an @actionCode 36146A, an ID 36154A, a VersionID 36162A, a Name 36170A, a TypeCode 36178A, and a ValidityPeriod 36186A. The @LanguageCode 36122A is of type GDT 36126A LanguageCode 36128A. The @currencyCode 36130A is of type GDT 36134A CurrencyCode 36136A. The @unitCode 36138A is of type GDT 36142A MeasureUnitCode 36144A. The @actionCode 36146A is of type GDT 36150A ActionCode 36152A. The ID 36154A is of type GDT 36158A CatalogueID 36160A. The VersionID 36162A is of type GDT 36166A VersionID 36168A. The Name 36170A is of type GDT 36174A Name 36176A. The TypeCode 36178A is of type GDT 36182A CatalogueTypeCode 36184A. The ValidityPeriod 36186A is of type GDT 36090A DateTimePeriod 36192A. There is one or zero 36124A @LanguageCode 36122A for each Catalogue entity 36014A. There is one or zero 36132A @currencyCode 36130A for each Catalogue entity 36014A. There is one or zero 36140A @unitCode 36138A for each Catalogue entity 36014A. There is one or zero 36148A @actionCode 36146A for each Catalogue entity 36014A. There is one 36156A ID 36154A for each Catalogue entity 36014A. There is one or zero 36164A VersionID 36162A for each Catalogue entity 36014A. There is one or zero 36172A Name 36170A for each Catalogue entity 36014A. There is one 36180A TypeCode 36178A for each Catalogue entity 36014A. There is one or zero 36188A ValidityPeriod 36186A for each Catalogue entity 36014A.

The ValidityPeriod 36186A includes a StartDateTime 36196A of type GDT 36000B DateTime 36102B and an EndDateTime 36104B of type GDT 36008B DateTime 36110B. There is one or zero 36198A StartDateTime 36196A for the ValidityPeriod 36186A and one or zero 36106B EndDateTime 36104B for the ValidityPeriod 36186A.

The Catalogue package 36136 also includes a GlobalInformation package 36012B, a CatalogueModel ("Model") package 36014B, and a CatalogueContent ("Content") package 36016B. The GlobalInformation package 36012B includes a ProviderPropertyValuation entity 36018B. The ProviderPropertyValuation entity 36018B is of type GDT 36122B PropertyValuation 36124B. There is any number 36120B of ProviderPropertyValuation entities 36018B for each Catalogue entity 36014A.

The ProviderPropertyValuation entity 36018B includes a PropertyReference 36128B and a PropertyValue 36148B. The PropertyReference 36128B is of type GDT 36132B PropertyReference 36134B. There is one 36130B PropertyReference 36128B for each ProviderPropertyValuation entity 36018B. The PropertyReference 36128B has one 36140B ID 36138B of type GDT 36142B PropertyID 36144B The PropertyValue 36148B is of type GDT 36152B PropertyValue 36154B. There is any number 36130B of PropertyValues 36148B for each ProviderPropertyValuation entity 36018B. The PropertyValue 36148B may include an AmountSpecification 36158B, a QuantitySpecification 36186B, a DecimalSpecification 36114C, a FloatSpecification 36140C, a IntegerSpecification 36168C, a DateTimeSpecification 36196C, a NameSpecification 36124D, and a IndicatorSpecification 36136D. For each PropertyValue 36148B, there is one or zero 36160B AmountSpecification 36158B, one or zero 36188B QuantitySpecification 36186B, one or zero 36116C DecimalSpecification 36114C, one or zero 36142C FloatSpecification 36140C, one or zero 36170C IntegerSpecification 36168C, one or zero 36198C DateTimeSpecification 36196C, one or zero 36126D NameSpecification 36124D, and one or zero 36138D IndicatorSpecification 36136D.

The AmountSpecification 36158B may include a one or zero 36164B of a Amount 36158B of type GDT 36166B Amount 36168B, one or zero 36172B of a LowerAmount 36170B of type GDT 36174B Amount 36176B and one or zero 36180B of an UpperAmount 36178B of type GDT 36182B Amount 36184B.

The QuantitySpecification 36186B may include a one or zero 36192B of a Quantity 36190B of type GDT 36194B Quantity 36196B, one or zero 36100C of a LowerQuantity 36198B of type GDT 36100C Quantity 36104C and one or zero 36108C of an UpperQuantity 36106C of type GDT 36110C Quantity 36112C.

The DecimalSpecification 36114C may include a one or zero 36119C of a DecimalValue 36118C of type GDT 36120C DecimalValue 36122C, one or zero 36126C of a LowerDecimalValue 36124C of type GDT 36128C DecimalValue 36130C and one or zero 36134C of an UpperDecimalValue 36132C of type GDT 36136C DecimalValue 36138C.

The FloatSpecification 36140C may include a one or zero 36146C of a FloatValue 36144C of type GDT 36148C FloatValue 36150C, one or zero 36154C of a LowerFloatValue 36152C of type GDT 36156C FloatValue 36158C and one or zero 36162C of an UpperFloatValue 36160C of type GDT 36164C FloatValue 36166C.

The IntegerSpecification 36168C may include a one or zero 36174C of a IntegerValue 36172C of type GDT 36176C IntegerValue 36178C, one or zero 36182C of a LowerIntegerValue 36180C of type GDT 36184C IntegerValue 36186C and one or zero 36190C of an UpperIntegerValue 36188C of type GDT 36192C IntegerValue 36194C.

The DateTimeSpecification 36196C may include a one or zero 36102D of a DateTime 36100D of type GDT 36104D DateTime 36106D, one or zero 36110D of a StartDateTime 36108D of type GDT 36112D DateTime 36114D and one or zero 36118D of an EndDateTime 36116D of type GDT 36120D DateTime 36122D.

The NameSpecification 36124D may include a one or zero 36102D of a Name 36128D, which is of type GDT 36132D Name 36134D that may include one or zero 36135D @languageCode 36133D. The IndicatorSpecification 36136D may include a one or zero 36142D of an Indicator 36140D, which is of type GDT 36144D Indicator 36146D.

Turning to FIG. 361I, the CatalogueModel package 36114B includes a CatalogueModel entity 36148D, which is of type GDT 36152D CatalogueModel 36154D. There is one or zero 36150D CatalogueModel entity for each Catalogue entity 36114A. The CatalogueModel entity 36148D includes a PropertyDataTypeListCompleteTransmissionIndicator 36156D of type GDT 36160D CompleteTransmissionIndicator 36162D, a PropertyListCompleteTransmissionIndicator 36164D of type GDT 36168D CompleteTransmissionIndicator 36170D, a CatalogueSectionTypeListCompleteTransmissionIndicator 36172D of type GDT 36176D CompleteTransmissionIndicator 36178D, and a CatalogueSchemaListCompleteTransmissionIndicator 36180D of type GDT 36184D CompleteTransmissionIndicator 36186D. There is one or zero 36158D PropertyDataTypeListCompleteTransmissionIndicator 36156D for each CatalogueModel entity 36148D. There is one or zero 36166D PropertyListCompleteTransmissionIndicator 36164D for each CatalogueModel entity 36148D. There is one or zero 36174D CatalogueSectionTypeListCompleteTransmissionIndicator 36172D for each CatalogueModel entity 36148D. There is one or zero 36182D CatalogueSchemaListCompleteTransmissionIndicator 36180D for each CatalogueModel entity 36148D.

The CatalogueModel package 36114B also includes a PropertyDataType package 36188D, a Property package 36190D, a CatalogueSectionType package 36192D, and a CatalogueSchema package 36194D. The PropertyDataType package 36188D includes a PropertyDataType entity 36195D. The PropertyDataType entity 36195D is of type GDT 36197D PropertyDataType 36198D. There is any number 36196D of PropertyDataType entities 36195D for each CatalogueModel entity 36148D.

The PropertyDataType entity 36195D may include an @actionCode 36100E, an ID 36106E, a PreferredName 36114E that may include one or zero 36124E @languageCode, a FormatCode 36126E, a MaximumTotalDigitNumberValue 36134E, a FractionalDigitNumberValue 36142E, a ComponentProperty 36150E, and an AllowedPropertyValueElement 36178E. The @actionCode 36100E is of type GDT 36102E ActionCode 36104E. The ID 36106E is of type GDT 36110E PropertyDataTypeID 36112E. The PreferredName 36114E is of type GDT 36118E Name 36120E. The FormatCode 36126E is of type GDT 36130E PropertyDataTypeFormatCode 36132E. The MaximumTotalDigitNumberValue 36134E is of type GDT 36138E DigitNumberValue 36140E. The FractionalDigitNumberValue 36142E is of type GDT 36046E DigitNumberValue 36148E.

For each PropertyDataType entity 36195D, there is one or zero 36101E @actionCode 36100E , one or zero 36108E ID 36106E, one or more 36116E PreferredNames 36114E, one 36128E FormatCode 36126E, one or zero 36136E MaximumTotalDigitNumberValue 36134E, one or zero 36144E FractionalDigitNumberValue 36142E, any number 36152E of Component Properties 36150E, and any number 36152E of AllowedPropertyValueElements 36178E.

In one implementation, each ComponentProperty 36150E includes one 36156E Reference 36154E of type GDT 36158D PropertyReference 36160E and any number 36172E of OrdinalNumberValues 36170E of type GDT 36174E OrdinalNumberValue 36176E. In this implementation, the Reference 36154E includes one 36164E ID 36162E of type GDT 36166E PropertyID 36168E. The AllowedPropertyValueElement 36178E may also include one 36184E PropertyValue 36182E of type GDT 36186E PropertyValue 36188E.

Turning to FIG. 361L, the Property package 36190D includes a Property entity 36192E of type GDT 36196E Property 36198E. There is zero or more 36194E Property entities 36192E for each CatalogueModel entity 36148D. Each Property entity 36192E includes an @actionCode 36102F, an ID 36110F, a PreferredName 36118F, a PropertyDataTypeReference 36126F, an AspectID 36146F, a TargetInterfaceElementID 36154F, a MultipleValueIndicator 36162F, a TextSearchableIndicator 36170F, a ParametricSearchableIndicator 36178F, and a ValuationRequiredIndicator 36188F. The @actionCode 36102F is of type GDT 36106F ActionCode 36108F. The ID 36110F is of type GDT 36114F PropertyID 36116F. The PreferredName 36118F is of type GDT 36122F Name 36124F. The PropertyDataTypeReference 36126F is of type GDT 3613OF PropertyDataTypeReference 36132F. The AspectID 36146F is of type GDT 36150F AspectID 36152F. The TargetInterfaceElementID 36154F is of type GDT 36058F InterfaceElementID 36160F. The MultipleValueIndicator 36162F is of type GDT 36066F PropertyMultipleValueIndicator 36168F. The TextSearchableIndicator 36170F is of type GDT 36074F TextSearchableIndicator 36176F. The ParametricSearchableIndicator 36178F is of type GDT 36082F PropertyParametricSearchableIndicator 36184F. The ValuationRequiredIndicator 36188F is of type GDT 36192F PropertyValuationRequiredIndicator 36194F.

For each Property entity 36190D, there is one or zero 36110F @actionCode 36108F, one or zero 36112F ID 36110F, one or more 36120F PreferredNames 36118F, one 36128F PropertyDataTypeReference 36126F, zero or more 36148F AspectIDs 36146F, zero or more 36156F TargetInterfaceElementID 36154F, one or zero 36164F MultipleValueIndicator 36162F, one or zero 36180F ParametricSearchableIndicator 36178F, and one or zero 36190F ValuationRequiredIndicator 36188F.

Turning to FIG. 361N, the CatalogueSectionType package 36192D includes a CatalogueSectionType entity 36194F. The CatalogueSectionType entity 36194F is of type GDT 36198F CatalogueSectionType 36100G. There is any number of CatalogueSectionType entities 36194F for each CatalogueModel entity 36148D. The CatalogueSectionType entity 36194F includes includes an (actionCode 36102G, an ID 36110G, a Name 36118G and a SectionProperty entity 36126G. The @actionCode 36102G is of type GDT 36106G ActionCode 36108G. The ID 36110G is of type GDT 36114G CatalogueSectionTypeID 36116G. The Name 36118G is of type GDT 36122G Name 36124G. The CatalogueSectionProperty entity 36126G is of type GDT 36130G CatalogueSectionTypeSectionProperty 36132G. For each CatalogueSectionType entity 36194F, there is one or zero 36104G @actionCode 36102G, one 36112G ID 36110G, zero or more 36120G Names 36118G and zero or more 36128G SectionProperty entities 36126G.

Each SectionProperty 36126G includes a PropertyReference 36134G and a OrdinalNumberValue 36152G. The PropertyReference 36134G is of type GDT 36138G PropertyReference 36140G and includes one 36146G ID 36144G of type 36148G PropertyID 36150G. The OrdinalNumberValue 36152G is of type GDT 36156G OrdinalNumberValue 36158G. In one implementation, for each SectionProperty 36126G, there is one 36136G PropertyReference 36134G and one 36154G OrdinalNumberValue 36152G.

The CatalogueSchema package 36194D includes a CatalogueSchema entity 36160G. The CatalogueSchema entity 36160G is of type GDT 36164G CatalogueSchema 36166G. There is any number 36162G CatalogueSchema entities 36160G for each CatalogueModel entity 36148D. The CatalogueSchema entity 36160G includes an @ActionCode 36168G, an ID 36176G, a TypeCode 36184G, a Name 36192G, a CatalogueSectionListCompleteTransmissionIndicator 36100H, a CatalogueSectionRelationshipListCompleteTransmissionIndicator 36108H, a CatalogueItemProperty entity 36116H, a Catalogue Section entity 36150H, and a CatalogueSectionRelationship entity 36130I. The @ActionCode 36168G is of type GDT 36172G ActionCode 36174G. The ID 36176G is of type GDT 36180G CatalogueSchemaID 36182G. The TypeCode 36184G is of type GDT 36188G CatalogueSchemaTypeCode 36190G.

The Name 36192G is of type GDT 36196G Name 36198G. The CatalogueSectionListCompleteTransmissionIndicator 36100H is of type GDT 36104H CompleteTransmissionIndicator 36106H. The CatalogueSectionRelationshipListCompleteTransmissionIndicator 36108H is of type GDT 36112H CompleteTransmissionIndicator 36114H. The CatalogueItemProperty entity 36116H is of type GDT 36120H CatalogueSchemaCatalogueItemProperty 36122H. The CatalogueSection entity 36150H is of type GDT 36154H CatalogueSection 36156H. The CatalogueSectionRelationship entity 36130I is of type GDT 36134I CatalogueSectionRelationship 36135I.

For each CatalogueSchema entity 36160G, there is one or zero 36170G @ActionCodes 36168G, one 36178G ID 36176G, one or zero 36186G TypeCode, zero or more 36194G Names 36192G, one or zero 36102H CatalogueSectionListCompleteTransmissionIndicator 36100H, one or zero 36110H CatalogueSectionRelationshipListCompleteTransmissionIndicator 36108H, any number 36118H of CatalogueItem Property entities 36116H, any number 36152H of CatalogueSection entitites 36150H, and any number 36132I of CatalogueSectionRelationship entities 36130I.

Each CatalogueItemProperty entity 36116H includes a PropertyReference 36124H and a OrdinalNumberValue 36142H. The PropertyReference 36124H is of type GDT 36128H PropertyReference 36130H and includes one 36136H ID 36134H of type GDT 36138H PropertyID 36140H. The OrdinalNumberValue 36142H is of type GDT 36146H OrdinalNumberValue 36148H. In one implementation, for each CatalogueItemProperty entity 36116H, there is one 36126H PropertyReference 36130H and one 36144H OrdinalNumberValue 36142H.

Each CatalogueSection entity 36150H may include an @actionCode 36158H, an ID 36166H, a TypeID 36174H, a Name 36182H, a PropertyValuation entity 36190H, and a CatalogueItemProperty entity 36100I. The @actionCode 36158H is of type GDT 36162H ActionCode 36164H. The ID 36166H is of type GDT 36168H CatalogueSectionID 36170H. The TypeID 36174H is of type GDT 36178H CatalogueSectionTypeID 36180H. The Name 36182H is of type GDT 36186H Name 36188H. The PropertyValuation entity 36190H is of type GDT 36194H PropertyValuation 36196H. The CatalogueItemProperty entity 36100I is of type GDT 36104I CatalogueSectionCatalogueItemProperty 36106I. For each CatalogueSection entity 36150H, there is one or zero 36160H @actionCode 36158H, one 36168H ID 36166H, one or zero 36176H TypeID 36174H, zero or more 36184H Names 36182H, zero or more 36192H PropertyValuation entities 36190H, and zero or more 36102I CatalogueItemProperty entities 36100I.

Each CatalogueItemProperty entity 36100I of a respective CatalogueSection entity 36150H includes a PropertyReference 36108I and a OrdinalNumberValue 36124I. The PropertyReference 36108I is of type GDT 36112I PropertyReference 36114I and includes one 36120I ID 36118I of type GDT 36122I PropertyID 36123I. The OrdinalNumberValue 36124I is of type GDT 36128I OrdinalNumberValue 36129I. In one implementation, for each CatalogueItemProperty entity 36100I, there is one 36110I PropertyReference 36108I and one 36126I OrdinalNumberValue 36124I.

Each CatalogueSectionRelationship entity 36130I includes an @actionCode 36136I, a SourceCatalogueSectionID 36144I, and a TargetCatalogueSectionID 36152I. The @actionCode 36136I is of type GDT 36140I ActionCode 36142I. The SourceCatalogueSectionID 36144I is of type GDT 36142I CatalogueSectionID 36150I. The TargetCatalogueSectionID 36152I is of type GDT 36156I CatalogueSectionID 36158I. For each CatalogueSectionRelationship entity 36130I, there is one or zero 36138I @actionCode 36136I, one 36146I SourceCatalogueSectionID 36144I, and one 36154I TargetCatalogueSectionID 36152I.

The Content or CatalogueContent package 36116B includes a CatalogueContent entity 36160I. The CatalogueContent entity 36160I is of type GDT 36164I CatalogueSectionID 36166I. There is one or zero 36162I for each Catalogue entity 36114A. The CatalogueContent entity 36160I includes a CatalogueItemListCompleteTransmissionIndicator 36168I, a CatalogueItemRelationshipListCompleteTransmissionIndicator 36176I, a CatalogueViewListCompleteTransmissionIndicator 36184I, and a CatalogueSchemaID 36192I. The CatalogueItemListCompleteTransmissionIndicator 36168I is of type GDT 36172I CompleteTransmissionIndicator 36174I. The CatalogueItemRelationshipListCompleteTransmissionIndicator 36176I is of type GDT 36180I CompleteTransmissionIndicator 36182I. The CatalogueViewListCompleteTransmissionIndicator 36184I is of type GDT 36188I CompleteTransmissionIndicator 36190I. The CatalogueSchemaID 36192I is of type GDT 36196I CatalogueSchemaID 36198I. In one implementation, for each Catalogue entity 36114A, there is one or zero 36170I CatalogueItemListCompleteTransmissionIndicator 36168I, one or zero 36178I CatalogueItemRelationshipListCompleteTransmissionIndicator 36176I, one or zero 36186I CatalogueViewListCompleteTransmissionIndicator 36184I, and one or zero 36194I CatalogueSchemaID 36192I.

The Content or CatalogueContent package 36116B also includes a CatalogueItem package 36100J and a CatalogueView package 36101J. The CatalogueItem package 36100J includes a CatalogueItem entity 36102J. The CatalogueItem entity 36102J is of type GDT 36106J CatalogueItem 36108J. There is any number 36104J of CatalogueItem entities 36102J for each Catalogue entity 36114A. The CatalogueItem entity 36102J may include an @actionCode 36110J, an ID 36118J, a CatalogueItemDescription entity 36126J, a CatalogueItemClassification entity 36134J, and a CatalogueItemPropertyValuation entity 36158J. The @actionCode 36110J is of type GDT 36114J ActionCode 36116J. The ID 36118J is of type GDT 36122J CatalogueSectionID 36124J. The CatalogueItemDescription entity 36126J is of type GDT 36130J Description 36132J. The CatalogueItemClassification entity 36134J is of type GDT 36138J CatalogueItemClassification 36140J. The CatalogueItemPropertyValuation entity 36158J is of type GDT 36162J PropertyValuation 361964J. For each CatalogueItem entity 36102J, there is one or zero 36112J @actionCode 36110J, one 36120J ID 36118J, any number 36128J of CatalogueItemDescription entities 36126J, any number 36134J of CatalogueItemClassification entities 36134J, and any number 36160J of PropertyValuation entities 36158J.

Each CatalogueItemClassification entity 36134J includes a CatalogueSchemaID 36142J and a CatalogueSectionID 36150J. The CatalogueSchemaID 36142J is of type GDT 36146J CatalogueSchemaID 36148J. The CatalogueSectionID 36150J is of type GDT 36154J CatalogueSectionID 36156J. For each CatalogueItemClassification entity 36134J, there is one or zero 36144J CatalogueSchemaID 36142J and one 36152J CatalogueSectionID 36150J.

The CatalogueItem package 36100J also includes a CatalogueItemRelationship entity 36168J. The CatalogueItemRelationship entity 36168J is of type GDT 36172J CatalogueItemRelationship 36174J. There is any number 36170J of CatalogueItemRelationship entities 36168J for each Catalogue entity 36114A. The CatalogueItemRelationship entity 36168J includes an @actionCode 36176J, a SourceCatalogueItemID 36184J, a TargetCatalogueItemID 36192J, and a TypeCode 36100K. The @actionCode 36176J is of type GDT 36180J ActionCode 36182J. The SourceCatalogueItemID 36184J is of type GDT 36188J CatalogueItemID 36190J. The TargetCatalogueItemID 36192J is of type GDT 36196J CatalogueItemID 36198J. The TypeCode 36100K is of type GDT 36104K ObjectStructureRelationshipTypeCode 36106K. In one implementation, for each CatalogueItemRelationship entity 36168J, there is one or zero 36178J @actionCode 36176J, one 36186J SourceCatalogueItemID 36184J, one 36194J TargetCatalogueItemID 36192J, and one 36102K TypeCode 36100K.

The CatalogueView package 36101J includes a CatalogueView entity 36108K. The CatalogueView entity 36108K is of type GDT 36112K CatalogueView 36114K. There is any number 36110K of CatalogueView entities 36108K for each CatalogueContent entity 36160I. The CatalogueView entity 36108K may include an @actionCode 36116K, an ID 36124K, a Name 36132K, an ItemListCompleteTransmissionIndicator 36140K, an ItemRelationshipTypeListCompleteTransmissionIndicator 36148K, an ExcludedPropertyListCompleteTransmissionIndicator 36156K, a CatalogueViewSchema or Schema entity 36164K, a CatalogueViewItem or Item entity 36112L and a CatalogueViewItemRelationshipType entity or ItemRelationshipType 36136L. The @actionCode 36116K is of type GDT 36120K ActionCode 36122K. The ID 36124K is of type GDT 36128K CatalogueViewID 36130K. The Name 36140K is of type GDT 36136K GDT Name 36138K. The ItemListCompleteTransmissionIndicator 36140K is of type GDT 36144K CompleteTransmissionIndicator 36146K. The ItemRelationshipTypeListCompleteTransmissionIndicator 36148K is of type GDT 36152K CompleteTransmissionIndicator 36154K. The ExcludedPropertyListCompleteTransmissionIndicator 36156K is of type GDT 36160K CompleteTransmissionIndicator 36162K. The CatalogueViewSchema entity 36164K is of type GDT 36168K CatalogueViewSchema 36170K. The CatalogueViewItem 36112L is of type GDT 36116L CatalogueViewItem 36118L. The CatalogueViewItemRelationshipType entity 36136L is of type GDT 36140L CatalogueViewItemRelationshipType 36142L. In one implementation, for each CatalogueView entity 36108K, there is one or zero 36118K (actionCode 36116K, one 36126K ID 36124K, zero or more 36134K Names 36132K, one or zero 36142K ItemListCompleteTransmissionIndicator 36140K, one or zero 36150K ItemRelationshipTypeListCompleteTransmissionIndicator 36148K, one or zero 36158K ExcludedPropertyListCompleteTransmissionIndicator 36156K, any number 36166K of CatalogueViewSchema entities 36164K, any number 36114L of CatalogueViewItem entities 36112L and any number 36138L of CatalogueViewItemRelationshipType entities 36136L.

The CatalogueViewSchema entity 36164K includes a SectionListCompleteTransmissionIndicator 36172K, a CatalogueSchemaID or ID 36180K and a CatalogueViewSchemaSection or Section entity 36188K. The SectionListCompleteTransmissionIndicator 36172K is of type GDT 36176K CompleteTransmissionIndicator 36178K. The ID 36180K is of type GDT 36184K CatalogueSchemaID 36186K. The CatalogueViewSchemaSection 36188K is of type GDT 36192K CatalogueSchemaID 36180K. In one implementation, for each CatalogueViewSchema entity 36164K, there is one or zero 36174K SectionListCompleteTransmissionIndicator 36172K, one 36182K ID 36180K and any number 36190K of CatalogueViewSchemaSection entities 36188K.

Each CatalogueViewSchemaSection entity 36188K includes an @actionCode 36196K and a CatalogueSectionID or ID 36104L. The @actionCode 36196K is of type GDT 36100L ActionCode 36102L. The ID 36104L is of type GDT 36108L CatalogueSectionID 36110L. In one implementation, for each CatalogueViewSchemaSection entity 36188K, there is one or zero 36198K @actionCode 36196K and one 36106L ID 36104L.

The CatalogueViewItem entity 36112L includes an @actionCode 36120L and a CatalogueItemID or ID 36128L. The @actionCode 36120L is of type GDT 36124L ActionCode 36126L. The ID 36128L is of type GDT 36132L CatalogueItemID 36134L. In one implementation, for each CatalogueViewItem entity 36112L, there is one or zero 36122L @actionCode 36120L and one 36130L ID 36128L.

The CatalogueViewItemRelationshipType entity 36136L includes an @actionCode 36144L and a CatalogueItemRelationshipTypeCode 36152L. The @actionCode 36144L is of type GDT 36148L ActionCode 36150L and the CatalogueViewItemRelationshipType entity 36136L is of type GDT 36156L ObjectStructureRelationshipTypeCode 36158L. In one implementation, for each CatalogueViewItemRelationshipType entity 36136L, there is one or zero 36146L @actionCode 36144L and one 36154L CatalogueItemRelationshipTypeCode 36152L.

The CatalogueViewExcludedProperty or Excluded Property 36160L includes an @actionCode 36168L and a PropertyReference 36176L that may have one 36188L ID 36186L. The @actionCode 36168L is of type GDT 36172L ActionCode 36174L. The PropertyReference 36176L is of type GDT 36180L PropertyReference 36182L. The ID 36186L is of type GDT 36190L PropertyID 3619L. In one implementation, for each CatalogueViewExcludedProperty 36160L, there is one or zero 36170L @actionCode 36168L and one 36178L PropertyReference 36176L.

(6) Message Data Type Catalogue Publication Message

The data model for the message data type CataloguePublicationMessage used to implement a CataloguePublicationRequest 35910 is depicted in FIG. 362. The data model for the message data type CataloguePublicationMessage is similar to the data model for the message data type CatalogueUpdateMessage as discussed above. The message data type CataloguePublicationMessage includes a CataloguePublicationMessage package 36202. The CataloguePublicationMessage package 36202 includes a MessageHeader package 36204, a TransmissionInformation package 36206, a Catalogue package 36208, and a CataloguePublicationMessage entity 36210.

(a) Message Header Package

A MessageHeader package 36204 groups the business-related information relevant for sending a Business Document in a message. The MessageHeader package 36204 includes a MessageHeader entity 36212 and a SenderParty entity 36216. There is a 1:1 relationship 36214 between the MessageHeader entity 36212 and the CataloguePublicationMessage entity 36210. There is a 1:c relationship 36218 between the MessageHeader entity 36212 and the SenderParty entity 36216.

The MessageHeader entity 36212 groups the business-related information from the sending application's point of view for identifying the Business Document in a message, information about the sender, and potentially information about the receiver. The MessageHeader entity 36212 is of type GDT BusinessDocumentMessageHeader.

The SenderParty entity 36216 is the party responsible for sending of a business document on a business-related application level. The SenderParty entity 36216 is of type GDT BusinessDocumentMessageHeaderParty.

(b) Transmission Information Package

The TransmissionInformation package 36206 groups the information pertaining to the transmission of the object or entity (e.g., the CataloguePublicationMessage entity 36210) included in the message. The TransmissionInformation package 36206 includes a TransmissionHeader entity 36220. There is a 1:c relationship 36222 between the CataloguePublicationMessage entity 36210 and the TransmissionHeader entity 36220. A TransmissionHeader entity 36220 provides information about the identification of a transmission (and one or more of the TransmissionHeader entity's 36218 packages). Additionally the minimum requested severity of events occurring during the processing of the transmission which have to be logged and returned may be specified. The TransmissionHeader entity 36220 includes an ID, a PackageOrdinalNumberValue, a PackageTotalNumberValue, and a MinimumRequestedLogItemSeverityCode.

The ID is a unique identification number grouping several data packages into one Catalogue transmission, and is of type GDT Transmission ID. The PackageOrdinalNumberValue specifies the sequence number identifying a data package in a multiple data package transmission, and is of type GDT OrdinalNumberValue. The PackageTotalNumberValue specifies the total number of data packages making up a Catalogue transmission, and is of type GDT TotalNumberValue. The MinimumRequestedLogItemSeverityCode specifies the severity of log items to be returned by messages CataloguePublicationTransmissionPackageNotification and CataloguePublicationConfirmation, and is of type GDT LogItemSeverityCode.

Catalogues often contain such a large amount of data that they may not be exchanged in one single message. Large catalogues are therefore split into smaller part messages (e.g., CataloguePublicationNotification messages 35910) each of which is transmitted separately.

(c) Catalogue Package

The Catalogue package 36208 groups the information necessary to describe the structure and content of a Catalogue. The Catalogue package 36208 includes a GlobalInformation package 36224, a CatalogueModel ("Model") package 36226, a CatalogueContent ("Content") package 36228, and a Catalogue entity 36230. There is a 1:1 relationship 36232 between the CataloguePublicationMessage entity 36210 and the Catalogue entity 36230.

(i) Catalogue Entity

A Catalogue entity 36230 included in a CataloguePublication Message 36202 may correspond to a new, changed or deleted Catalogue. A Catalogue entity 36230 is a structured directory of Catalogue items. Each item represents an object, and provides information about the object. The Catalogue entity 36230 references global information (e.g., as implemented in the GlobalInformation package 36224), model information (e.g., as implemented in the CatalogueModel package 36226) and content information (e.g., as implemented in the GlobalInformation package 36228). The global information provides information relevant to the entire Catalogue entity 36230. The model information defines the structure of the Catalogue entity 36230 content and the properties used to describe this content. Content information includes the items of the Catalogue entity 36230 and each of the items structural assignment within the Catalogue entity 36230 structure.

The Catalogue entity 36230 may include the following elements or attributes:

1) @LanguageCode, which specifies the language for a description or name associated with the Calalogue entity 36222. The @LanguageCode is of type GDT:LanguageCode.

2) @currencyCode, which specifies the currency in an element Amount. The @currencyCode is of type GDT:CurrencyCode.

3) @unitCode, which specifies the unit code in an element Quantity. The @unitCode is of type GDT:MeasureUnitCode 4) @actionCode, which specifies the operation to be performed on the complete catalogue. The @actionCode is of type GDT:ActionCode.

5) ID, which identifies the Catalogue entity 36230 being transmitted. The ID is of type GDT:CatalogueID.

6) VersionID, which identifies the version of the Catalogue entity 36230 being transmitted. The VersionID is of type GDT:VersionID.

7) Name, which identifies a name for the entire Catalogue in a language identified by @LanguageCode. The Name is of type GDT:Name.

8) TypeCode, which specifies the type of Catalogue entity 36230 being transmitted. For example, TypeCode may indicate the type as a supplier catalogue or purchasing catalogue. The TypeCode is of type GDT:CatalogueTypeCode.

9) ValidityPeriod, which specifies the period during which the Catalogue entity 36230 is valid. The ValidityPeriod is of type GDT:DateTimePeriod.

For example, the Catalogue entity 36230 may be a products or parts Catalogue that corresponds to a directory of objects of type "product" providing information about products. In this example, the Catalogue entity 36230 facilitates finding products matching certain criteria specified by an actor (e.g., a catalogue user) and that may then be used in an associated business process. The business process may be for example "procurement," in which case the Catalogue entity 36230 is a "purchasing catalogue" or a "spare parts catalogue," or "sales catalogue." In case of a "sales catalogue," information from the Catalgoue entity 36222 may be provided such that the products seem especially appealing to the target group the Catalogue addresses. Alternatively, the Catalogue entity 36230 may correspond to a supplier directory of objects of type "supplier" used in a procurement process.

(ii) Catalogue Global Information Package

The GlobalInformation package 36224 groups the information relevant to the entire catalogue. The GlobalInformation package 36224 includes a ProviderPropertyValuation entity 36234. There is a 1:cn relationship 36236 between the CataloguePublicationMessage entity 36210 and the Catalogue entity 36230.

A ProviderPropertyValuation entity 36234 valuates properties provided by the Catalogue provider 35902 to provide additional information about the Catalogue entity 36230 (e.g., any information about the vendor/s, Catalogue creation date, or Notes). ProviderPropertyValuation entity 36234 is of type GDT:PropertyValuation, and uses PropertyReference and PropertyValue elements. The PropertyReference specifies the property that is being valuated. The PropertyReference is of type GDT:PropertyReference. The PropertyValue specifies the value of the property. The PropertyValue is of type GDT PropertyValue. As further discussed below, the PropertyValue includes the following elements: AmountSpecification, QuantitySpecification, DecimalSpecification, FloatSpecification, IntegerSpecification, DateTimeSpecification, NameSpecification, and IndicatorSpecification.

(iii) Catalogue Model Package

The CatalogueModel package 36226 includes a PropertyDataType package 36238, a Property package 36240, a CatalogueSectionType package 36242, and a CatalogueSchema package 36244, and CatalogueModel entity 36246. There is a 1:c relationship 36248 between the Catalogue entity 36230 and the CatalogueModel entity 36246.

(a) Catalogue Model

A CatalogueModel entity 36246 describes and structures the Catalogue content using systems of categories to group Catalogue items and properties that may be attributed to the Catalogue items or the categories themselves or both. The CatalogueModel entity 36246 is the information how the Catalogue content is structured and defined. The Catalogue Model entity 36246 defines properties, the data types of the proprerties, and allowed values, which are used to describe catalogue sections and/or the items included in the Catalogue as identified in associated PropertyDataType package 36238 and Property package 36240. Additionally, the Catalogue Model entity 36246 specifies one or more schemas as identified in associated CatalogueSchema package 36244, which defines the structural composition of the Catalogue content by means of sections and relationships between these sections. The sections of a schema correspond to divided up Catalogue items and include properties used to describe the Catalogue items assigned to the respective schema section. The CatalogueModel entity 36246 may have multiple schemas. The CatalogueModel entity 36246 includes a PropertyDataTypeListCompleteTransmissionIndicator, a PropertyListCompleteTransmissionIndicator, a CatalogueSectionTypeListCompleteTransmissionIndicator, and a CatalogueSchemaListCompleteTransmissionIndicator. The PropertyDataTypeListCompleteTransmissionIndicator specifies whether the list of PropertyDataTypes has been transmitted completely. The PropertyDataTypeListCompleteTransmissionIndicator is of type GDT:CompleteTransmissionIndicator. The PropertyListCompleteTransmissionIndicator specifies whether the list of Properties has been transmitted completely. The PropertyListCompleteTransmissionIndicator is of type GDT: CompleteTransmissionIndicator. The CatalogueSectionTypeListCompleteTransmissionIndicator specifies whether the list of SectionTypes has been transmitted completely. The CatalogueSectionTypeListCompleteTransmissionIndicator is of type GDT:CompleteTransmissionIndicator. The CatalogueSchemaListCompleteTransmissionIndicator specifies whether the list of Schemas has been transmitted completely. The CatalogueSchemaListCompleteTransmissionIndicator is of type GDT:CompleteTransmissionIndicator.

(b) Catalogue Model Property Data Type Package

The PropertyDataType package 36238 groups the information pertaining to property data types. The PropertyDataType package 36238 includes a PropertyDataType entity 36250. A PropertyDataType entity 36250 defines the data type of properties used in the Catalogue entity 36230 to describe Catalogue sections and Catalogue items. The PropertyDataType entity 36250 is of type GDT PropertyDataType. There is a 1:cn relationship 36252 between the CatalogueModel entity 36246 and the PropertyDataType entity 36250.

The PropertyDataType entity 36250 includes an @actionCode, which specifies the operation to be performed on the Property, an ID, a PreferredName, a FormatCode, a MaximumTotalDigitNumberValue, and a FractionalDigitNumberValue. In one implementation, the PropertyDataType entity 36250 also includes a ComponentProperty that has a Reference with PropertyID and an OrdinalNumberValue. The PropertyDataType entity 36250 may also include an AllowedPropertyValueElement that has a PropertyValue.

(c) Catalogue Model Property Package

The Property package 36240 groups the information pertaining to properties used in the catalogue. The Property package 36240 includes a Property entity 36254. There is a 1:cn relationship 36252 between the CatalogueModel entity 36246 and the PropertyDataType entity 36250. There is a 1:cn relationship 36256 between the CatalogueModel entity 36246 and the Property entity 36254.

The Property entity 36254 specifies a property and additional information for it that may be used to describe and differentiate between items included or sections used within the catalogue. The Property entity 36254 is of type GDT Property, and includes the following elements: an @actionCode; an ID; a PreferredName; a PropertyDataTypeReference; an AspectID, which identifies an aspect in which the Property entity 36254 is used; a TargetInterfaceElementID, which identifies an element of an interface the Property entity 36254 may be mapped to; a MultipleValueIndicator, which indicates whether the Property entity 36254 may contain multiple values; a TextSearchableIndicator, which indicates whether the Property entity 36254 is qualified for "Text Search"; a ParametricSearchableIndicator, which indicates whether the Property entity 36254 is qualified for "Parametric Search"; and a ValuationRequiredIndicator, which indicates whether a valuation is mandatory on the object which includes this Property entity 36254. The @actionCode specifies the operation to be performed on the Property entity 36254.

(d) Catalogue Model Section Type Package

The CatalogueModelSectionType or CatalogueSectionType package 36242 groups the information necessary to define a section type. The CatalogueSectionType package 36242 includes a CatalogueSectionType entity 36258. The CatalogueSectionType entity 36258 describes the nature of Catalogue sections by defining properties for the description of sections of this type. There is a 1:cn relationship 36260 between the CatalogueModel entity 36246 and the CatalogueSectionType entity 36258. A CatalogueSectionType entity 36258 may include one or more SectionProperty entities 36262 each of which describes a respective Catalogue section of the CatalogueSectionType entity 36258. Thus, there is a 1:cn relationship 36264 between the CatalogueModel entity 36246 and each Property entity 36262.

The CatalogueSectionType entity 36258 includes the following elements: an @actionCode, an ID, and a Name. The @actionCode is of type GDT:Action Code and specifies the operation to be performed on the CatalogueSectionType entity 36258. The ID is of type GDT:SectionTypeID and identifies the CatalogueSectionType entity 36258. The Name is of type GDT:Name and provides a name for the CatalogueSection type in a language identified by @LanguageCode of the Catalogue entity 36230.

A SectionProperty 36262 specifies a property pertaining to the CatalogueSectionType entity 36258 and the SectionProperty's 36262 position in the list of SectionProperty entities 36262 associated with the CatalogueSectionType entity 36258. The SectionProperty 36262 includes a PropertyReference and a OrdinalNumberValue. The PropertyReference is of type GDT:PropertyReference and includes an ID that identifies the SectionProperty 36262. The OrdinalNumberValue is of type GDT:OrdinalNumberValue and provides the SectionProperty's 36262 position in the list of SectionProperty entities 36262.

(e) Catalogue Model Schema Package

The CatalogueModelSchema or CatalogueSchema package 36244 groups the information pertaining to a Catalogue schema. It includes a CatalogueSchema entity 36266. The CatalogueSchema entity 36266 defines a structural composition of the Catalogue content in accordance with a pre-determined purpose. There is a 1:cn relationship 36268 between the CatalogueModel entity 36246 and the CatalogueSchema entity 36266. The CatalogueSchema entity 36266 may include one or more CatalogueItemProperty entities 36270 each of which describes a respective Catalogue item of the CatalogueSchema entity 36266. In addition, the CatalogueSchema entity 36266 also may include one or more CatalogueSection entities 36272 and one or more CatalogueSectionRelationship entities 36274. There is a 1:cn relationship 36276 between the CatalogueSchema entity 36266 and each CatalogueItemProperty entity 36270. There is a 1:cn relationship 36278 between the CatalogueSchema entity 36266 and each CatalogueSection entity 36272. There is a 1:cn relationship 36280 between the CatalogueSchema entity 36266 and each CatalogueSectionRelationship entity 36274.

The CatalogueSchema entity 36266 includes an @actionCode, an ID, a TypeCode, a Name, a SectionListCompleteTransmissionIndicator, and a SectionRelationshipListCompleteTransmissionIndicator. The @actionCode is of type GDT:ActionCode and specifies the operation to be performed on the CatalogueSchema entity 36266. The ID is of type GDT:CatalogueSchemaID and identifies the CatalogueSchema entity 36266. The TypeCode is of type GDT:CatalogueSchemaTypeCode and specifies the nature of the catalogue schema. The Name is of type GDT:Name and provides a name for a schema in a language identified by @LanguageCode of the Catalogue entity 36230. The SectionListCompleteTransmissionIndicator is of type GDT:CompleteTransmissionIndicator and specifies whether the list of sections has been transmitted completely. The SectionRelationshipListCompleteTransmissionIndicator is of type GDT:CompleteTransmissionIndicator and specifies whether the list of SectionRelationships has been transmitted completely. The CatalogueSchema entity 36266 supports a specific business process or addresses a specific target group. Thus, the CatalogueSchema entity 36266 may include multiple schemas.

(i) Catalogue Item Property

The CatalogueItemProperty entity 36270 specifies a property pertaining to a catalogue item and the CatalogueItemProperty's 36270 position in the list of properties attributed to the catalogue item. The CatalogueItemProperty entity 36270 includes a PropertyReference of type GDT:PropertyReference and an OrdinalNumberValue of type GDT:OrdinalNumberValue. The PropertyReference has an ID that identifies the property associated with the catalogue item. The OrdinalNumberValue specifies the CatalogueItemProperty's 36270 position in the list of properties attributed to the catalogue item.

(ii) Catalogue Section

Each CatalogueSection entity 36272 corresponds to a respective set of catalogue items in accordance with the CatalogueSchema 36266. Each CatalogueSection entity 36272 specifies properties which may be used to describe the set of catalogue items. Each CatalogueSection entity 36272 may include one more more PropertyValuation entities 36282 and one or more CatalogueItemProperty entities 36284. Thus, there is a 1:cn relationship 36286 between the CatalogueSection entity 36272 and each PropertyValuation entity 36282. There is also a 1:cn relationship 36288 between the CatalogueSection entity 36272 and each CatalogueItemProperty entity 36284.

Each CatalogueSection entity 36272 may also include an @actionCode, an ID, a TypeID, and a Name. The @actionCode is of type GDT:ActionCode and specifies the operation to be performed on the respective CatalogueSection entity 36272. The ID is of type GDT:CatalogueSectionID and identifies respective CatalogueSection entity 36272. The TypeID is of type GDT:CatalogueSectionTypeID and identifies a Section type to which the respective CatalogueSection entity 36272 belongs. The Name is of type GDT:Name and provides a name for the respective CatalogueSection entity 36272 in a language identified by @LanguageCode of the Catalogue entity 36230.

(iii) Catalogue Section Property Valuation

Each PropertyValuation or CatalogueSectionPropertyValuation 36282 includes the value of a property that may be attributed to or is used to describe the CatalogueSection entity 36272 in accordance with a CatalogueSection type 36258. The CatalogueSectionPropertyValuation entity 36282 is of type GDT PropertyValuation and has a PropertyReference of type GDT:PropertyReference and a PropertyValue of type GDT:PropertyValue. The PropertyReference references a valuated property defined in the CatalogueSectionType entity 36258 corresponding to the CatalogueSection 36272.

(iv) Catalogue Section Catalogue Item Property

Each CatalogueItemProperty or CatalogueSectionCatalogueItemProperty entity 36284 specifies a property pertaining to the catalogue items or objects associated with the respective CatalogueSection entity 36272. The CatalogueSectionCatalogueItemProperty entity 36284 also specifies the property's position in the full list of properties attributed to a catalogue item. The CatalogueSectionCatalogueItemProperty entity 36284 includes a PropertyReference of type GDT:PropertyReference and an OrdinalNumberValue of type GDT:OrdinalNumberValue. Each CatalogueSectionCatalogueItemProperty entity 36284 refers to a property defined as part of the CatalogueModel entity 36246 and may not be attributed to the catalogue items within the Catalogue entity 36230.

(v) Catalogue Section Relationship

Each CatalogueSectionRelationship entity 36274 specifies a connection between two CatalogueSection entities 36272 within a CatalogueSchema entity 36266. In one implementation, each CatalogueSectionRelationship entity 36274 corresponds to a parent-child connection between two CatalogueSection entities 36272, providing a hierarchical structure to the Catalogue entity 36230. The CatalogueSectionRelationship entity 36274 includes an @actionCode, a SourceCatalogueSectionID, and a TargetCatalogueSectionID. The @actionCode is of type GDT:ActionCode and specifies the operation to be performed on the corresponding CatalogueSectionRelationship entity 36274. The SourceCatalogueSectionID is of type GDT:CatalogueSectionID and identifies a source CatalogueSection entity 36272. The TargetCatalogueSectionID is of type GDT:CatalogueSectionID and identifies a target CatalogueSection entity 36272.

(iv) Catalogue Content Package

The Content or CatalogueContent package 36228 includes a CatalogueItem package 36290 and a CatalogueView package 36292, and a CatalogueContent entity 36294. There is a 1:c relationship 36296 between the Catalogue entity 36230 and the CatalogueContent entity 36294. The CatalogueContent entity 36294 specifies the list of business objects included in the catalogue reflected by the Catalogue entity 36230, together with their relationships and descriptions according to the catalogue's schemas reflected by the CatalogueSchema entity 36266, and the views (e.g., CatalogueView entities 36298) that are used to restrict the catalogue's information content for certain purposes. The CatalogueContent entity 36294 also specifies the items (e.g., CatalogueItem entities 36298) included in the Catalogue entity 36230 and each item's classification or assignment to Catalogue sections reflected by the one or more CatalogueSection entities 36272. The CatalogueContent entity 36294 includes a CatalogueItemListCompleteTransmissionIndicator, a CatalogueItemRelationshipListCompleteTransmissionIndicator, a CatalogueViewListCompleteTransmissionIndicator, and a CatalogueSchemaID. The CatalogueItemListCompleteTransmissionIndicator is of type GDT:CompleteTransmissionIndicator and specifies whether the list of items (e.g., CatalogueItem entities 36298) has been transmitted completely. The CatalogueItemRelationshipListCompleteTransmissionIndicator is of type GDT: CompleteTransmissionIndicator and specifies whether the list of ItemRelationships (e.g., CatalogueItemRelationship entities 36200A) has been transmitted completely. The CatalogueViewListCompleteTransmissionIndicator is of type GDT:CompleteTransmissionIndicator and specifies whether the list of Views (e.g., CatalogueView entities 36218A) has been transmitted completely. The CatalogueSchemaID identifies a catalogue schema (e.g., a CatalogueSchema entity 36272) to which the respective CatalogueContent entity 36294 is assigned. In one implementation, The CatalogueSchemaID of a first of the CatalogueContent entities 36294 functions as a default value for remaining CatalogueContent entities 36294 without a specified CatalogueSchemaID.

(a) Catalogue Content Catalogue Item Package

The CatalogueItem package 36290 groups the information pertaining to catalogue items. The CatalogueItem package 36290 includes a CatalogueItem entity 36298 and a CatalogueItemRelationship entity 36200A. There is a 1:cn relationship 36202A between the the CatalogueContent entity 36294 and the CatalogueItem entity 36298. There is a 1:cn relationship 36204A between the CatalogueContent entity 36294 and the CatalogueItemRelationship entity 36200A.

(i) Catalogue Item

The CatalogueItem entity 36298 specifies information about an object included and to be classified within the Catalogue entity 36230 in accordance with the Catalogue entity's 36230 schema as reflected by the CatalogueSchema entity 36266. The CatalogueItem entity 36298 includes a CatalogueItemDescription entity 36206A that describes the item reflected by the CatalogueItem entity 36298. The CatalogueItem entity 36298 may also include a CatalogueItemPropertyValuation entity 36208A and a CatalogueItemClassification entity 36210A. The CatalogueItem entity 36298 may further include an @actionCode and an ID. The @actionCode is of type GDT:ActionCode and specifies the operation to be performed on the item. The ID is of type GDT:CatalogueItemID and identifies the respective CatalogueItem entity 36298.

(ii) Catalogue Item Description

The CatalogueItemDescription entity 36206A is of type GDT:Description and provides a description for an item in a specified language. There is a 1:cn relationship 36212A between the CatalogueItem entity 36298 and the CatalogueItemDescription entity 36206A.

(iii) Catalogue Item Classification

The CatalogueItemClassification entity 36210A assigns the CatalogueItem entity 36298 to a respective CatalogueSection entity 36272 within one of the CatalogueSchema entities 36266 associated with the Catalogue entity 36230. The CatalogueItemClassification entity 36210A includes a SchemaID and a SectionID. The SchemaID is of type GDT:CatalogueSchemaID and identifies the schema (e.g., one of the CatalogueSchema entities 36266) that the CatalogueItem entity 36298 references. The SectionID is of type GDT:CatalogueSectionID and identifies the section (e.g., one of the CatalogueSection entities 36272) that the CatalogueItem entity 36298 references. There is a 1:cn relationship 36214A between the CatalogueItem entity 36298 and the CatalogueItemClassification entity 36206A.

(iv) Catalogue Item Property Valuation

The CatalogueItemPropertyValuation entity 36208A is of type GDT:PropertyValuation and specifies the value of a property that may be attributed to the object the CatalogueItem entity 36298 represents in accordance with one of the CatalogueSchema entities 36266. The CatalogueItemPropertyValuation entity 36208A includes a PropertyReference and a PropertyValue. The PropertyReference is of type GDT:PropertyReference and is the reference to the property to be valuated for the CatalogueItem entity 36298. The PropertyValue is of type GDT:PropertyValue and is the value of the property reflected by the PropertyReference. There is a 1:cn relationship 36216A between the CatalogueItem entity 36298 and the CatalogueItemPropertyValuation entity 36208A.

(v) Catalogue Item Relationship

The CatalogueItemRelationship entity 36200A specifies a relationship with certain semantics between any two CatalogueItem entities 36298. The CatalogueItemRelationship entity 36200A includes an @actionCode, a SourceCatalogueItemID, a TargetCatalogueItemID, and a TypeCode. The @actionCode is of type GDT:ActionCode and specifies the operation to be performed on the relationship between the two CatalogueItem entities 36298. The SourceCatalogueItemID is of type GDT:CatalogueItemID and identifies the source CatalogueItem entity 36298. The TargetCatalogueItemID is of type GDT:CatalogueItemID and identifies the target CatalogueItem entity 36298. The TypeCode is of type GDT:ObjectStructureRelationshipTypeCode and specifies the semantics of the relationship existing between the the source CatalogueItem entity 36298 and the target CatalogueItem entity 36298.

(b) Catalogue Content Catalogue View Package

The CatalogueView package 36292 groups the information pertaining to Catalogue views. The CatalogueView package 36292 includes a CatalogueView entity 36218A. There is a 1:cn relationship 36220A between the CatalogueContent entity 36294 and the CatalogueView entity 36218A.

(i) Catalogue View

The CatalogueView entity 36218A defines a subset of a Catalogue by specifying schemas, sections, Catalogue items and item relationship types to be included and properties to be excluded from a catalogue view. The CatalogueView entity 36218A may include a CatalogueViewSchema entity 36222A, a CatalogueViewItem entity 36224A and a CatalogueViewItemRelationshipType entity 36226A. In addition, the CatalogueView entity 36218A may include a CatalogueViewExcludedProperty entity 36228A, which specify properties not to be included in the view. The CatalogueView entity 36218A includes an @actionCode, an ID, a Name, an ItemListCompleteTransmissionIndicator, an ItemRelationshipTypeListCompleteTransmissionIndicator, and an ExcludedPropertyListCompleteTransmissionIndicator. The @actionCode is of type GDT:ActionCode and specifies the operation to be performed on the CatalogueView entity 36218A. The ID is of type GDT:CatalogueViewID and identifies a view ID. The Name is of type GDT:GDT Name and provides a name for the view in various languages. The ItemListCompleteTransmissionIndicator is of type GDT: CompleteTransmissionIndicator and specifies whether the item list has been transmitted completely. The ItemRelationshipTypeListCompleteTransmissionIndicator is of type GDT:CompleteTransmissionIndicator and specifies whether the list of item relationships has been transmitted completely. The ExcludedPropertyListCompleteTransmissionIndicator is of type GDT:CompleteTransmissionIndicator and specifies whether the list of excluded properties has been transmitted completely. There is a 1:cn relationship 36230A between the CatalogueView entity 36218A and the CatalogueViewSchema entity 36222A. There is a 1:cn relationship 36232A between the CatalogueView entity 36218A and the CatalogueViewItem entity 36224A. There is a 1:cn relationship 36234A between the CatalogueView entity 36218A and the CatalogueViewItemRelationshipType entity 36226A. There is a 1:cn relationship 36236A between the CatalogueView entity 36218A and the CatalogueViewItemRelationshipType entity 36226A.

(ii) Catalogue View Schema

The CatalogueViewSchema entity 36222A specifies a schema and a list of sections belonging to the schema that are to be included in a CatalogueView entity 36218A. The CatalogueViewSchema entity 36222A is subdivided into one or more CatalogueViewSchemaSection entities 36238A that specify Sections included in the CatalogueView entity 36218A. The CatalogueViewSchema entity 36222A includes an ID and a SectionListCompleteTransmissionIndicator. The ID is of type GDT:CatalogueSchemaID and identifies the respective CatalogueViewSchema entity 36222A. The SectionListCompleteTransmissionIndicator is of type GDT: CompleteTransmissionIndicator and specifies whether the list of sections (e.g., one or more CatalogueViewSchemaSections 36222A) has been transmitted completely.

(iii) Catalogue View Schema Section

The CatalogueViewSchemaSection entity 36222 specifies a section of the referenced catalogue schema (e.g., CatalogueViewSchema entity 36222A) to be included in the catalogue view. The CatalogueViewSchemaSection entity 36222 includes an @actionCode is of type GDT:ActionCode and an ID is of type GDT:CatalogueSectionID. The @actionCode specifies the operation to be performed on the CatalogueViewSchemaSection entity 36222 identified by the ID.

(iv) Catalogue View Item

The CatalogueViewItem entity 36224A specifies a CatalogueItem entity 36298 to be included in the catalogue view. The CatalogueViewItem entity 36224A includes an @actionCode of type GDT:ActionCode and an ID of type GDT: CatalogueItemID. The @actionCode specifies the operation to be performed on the CatalogueViewItem entity 36224A identified by the ID.

(v) Catalogue View Item Relationship Type

The CatalogueViewItemRelationshipType entity 36226A specifies a catalogue item relationship type. In one implementation, the catalogue item relationships of the CatalogueViewItemRelationshipType entity 36226A are included in the catalogue view. CatalogueViewItemRelationshipType entity 36226A includes an @actionCode of type GDT:ActionCode and a Code of type GDT:ObjectStructureRelationshipType Code. The @actionCode specifies the operation to be performed on the item relationship type identified by the Code.

(vi) Catalogue View Excluded Property

The CatalogueViewExcludedProperty 36228A specifies a property that is not included in the catalogue view. For example, a CatalogueViewExcludedProperty "Price" is defined in the CatalogueContent entity 36294 means that users that have access to the content of the respective catalogue reflected by the Catalog entity 36230 may not see the price of catalogue items (e.g., CatalogueItem entities 36298) of the catalogue. The CatalogueViewExcludedProperty 36228A includes an @actionCode of type GDT:ActionCode and a PropertyReference of type GDT: PropertyReference. The @actionCode specifies the operation to be performed on an excluded property identified by the PropertyReference.

(d) Message Data Type—Data Model (e) Message Data Type—Element Structure

FIGS. 363A-AZ depict the element structure for a CataloguePublicationRequest message 35910. The element structure is similar to the above described data model of the message data type CataloguePublicationMessage as reflected in FIG. 362, but provides additional information regarding the details for interfacing with or implementing a CataloguePublicationMessage, such as a CataloguePublicationRequest message 35910. As shown in FIGS. 363A-Z, the element structure identifies the different packages 36300 that may be in a respective CataloguePublicationRequest message 35910. The element structure for the CataloguePublicationRequest message 35910 includes eight levels 36302, 36304, 36306, 36308, 36310, 36312, 36314 and 36316 each of associated with a respective package 36300. The element structure identifies the cardinality 36318 and data type information (i.e., type 36320 and name 36322) for the elements at the respective levels 36302, 36304, 36306, 36308, 36310, 36312, 36314, and 36316.

The outermost package of this interface is a CataloguePublicationNotification package 36324, which includes a CataloguePublicationMessage entity 36326 at the first level 36302. The CataloguePublicationMessage entity 36026 is of generic data type ("GDT") 36328 CataloguePublicationMessage 36330.

The CataloguePublicationNotification package 36324 includes a MessageHeader package 36332, a TransmissionInformation package 36334, and a Catalogue package 36336. The MessageHeader package 36332 includes a MessageHeader entity 36340, which is of type GDT 36344 BusinessDocumentMessageHeader 36346. There is one 36342 MessageHeader entity 36340 for each CataloguePublicationMessage entity 36026.

The MessageHeader entity 36340 includes an ID 36350 and a CreationDateTime 36358. The ID 36350 is of type GDT 36354 BusinessDocumentMessageID 36356. The CreationDateTime 36358 is of type GDT 36362 DateTime 36364. There is one 36352 ID 36350 for each MessageHeader entity 36340 and one 36360 CreationDateTime 36358 for each MessageHeader entity 36340.

The MessageHeader entity 36340 also includes a SenderParty entity 36366. The SenderParty entity 36366 is of type GDT 36370 BusinessDocumentMessageHeaderParty 36372. There is one or zero 36368 SenderParty entity 36366 for each MessageHeader entity 36340.

The TransmissionInformation package 36334 includes a TransmissionHeader entity 36374. The TransmissionHeader entity 36374 is of type GDT 36378 BusinessDocumentTransmissionHeader 36380. There is one or zero 36376 TransmissionHeader entity 36374 for each CataloguePublicationMessage entity 36026. The TransmissionHeader entity 36374 includes an ID 36382, a PackageOrdinalNumberValue 36390, a PackageTotalNumberValue 36398, and a MinimumRequestedLogItemSeverityCode 36374A. The ID 36382 is of type GDT 36386 TransmissionID 36388. The PackageOrdinalNumberValue 36390 is of type GDT 36394 OrdinalNumberValue 36396. The PackageTotalNumberValue 36398 is of type GDT 36302A TotalNumberValue 36304A. The MinimumRequestedLogItemSeverityCode 36374A is of type GDT 36310A LogItemSeverityCode 36312A. There is one 36384 ID 36382 for each TransmissionHeader entity 36374.

There is one 36392 PackageOrdinalNumberValue 36390 for each TransmissionHeader entity 36374. There is one or zero 36300A PackageTotalNumberValue 36398 for each TransmissionHeader entity 36374. There is one or zero 36308A MinimumRequestedLogItemSeverityCode 36374A for each TransmissionHeader entity 36374.

The Catalogue package 36336 includes a Catalogue entity 36314A. The Catalogue entity 36014A is of type GDT 36318A TransmissionCatalogue 36320A. There is one 36316A Catalogue entity 36014A for each CataloguePublicationMessage entity 36026. Catalogue entity 36014A includes an @LanguageCode 36322A, an @currencyCode 36330A, an @unitCode 36338A, an @actionCode 36346A, an ID 36354A, a VersionID 36362A, a Name 36370A, a TypeCode 36378A, and a ValidityPeriod 36386A. The (LanguageCode 36322A is of type GDT 36326A LanguageCode 36328A. The @currencyCode 36330A is of type GDT 36334A CurrencyCode 36336A. The @unitCode 36338A is of type GDT 36342A MeasureUnitCode 36344A. The @actionCode 36346A is of type GDT 36350A ActionCode 36352A. The ID 36354A is of type GDT 36358A CatalogueID 36360A. The VersionID 36362A is of type GDT 36366A VersionID 36368A. The Name 36370A is of type GDT36374A Name 36376A. The TypeCode 36378A is of type GDT 36382A CatalogueTypeCode 36384A. The ValidityPeriod 36386A is of type GDT 36090A DateTimePeriod 36392A. There is one or zero 36324A @LanguageCode 36322A for each Catalogue entity 36014A. There is one or zero 36332A @currencyCode 36330A for each Catalogue entity 36014A. There is one or zero 36340A @unitCode 36338A for each Catalogue entity 36014A. There is one or zero 36348A @actionCode 36346A for each Catalogue entity 36014A. There is one 36356A ID 36354A for each Catalogue entity 36014A. There is one or zero 36364A VersionID 36362A for each Catalogue entity 36014A. There is one or zero 36372A Name 36370A for each Catalogue entity 36014A. There is one 36380A TypeCode 36378A for each Catalogue entity 36014A. There is one or zero 36388A ValidityPeriod 36386A for each Catalogue entity 36014A.

The ValidityPeriod 36386A includes a StartDateTime 36396A of type GDT 36000B DateTime 36302B and an EndDateTime 36304B of type GDT 36008B DateTime 36310B. There is one or zero 36398A StartDateTime 36396A for the ValidityPeriod 36386A and one or zero 36306B EndDateTime 36304B for the ValidityPeriod 36386A.

The Catalogue package 36336 also includes a GlobalInformation package 36012B, a CatalogueModel ("Model") package 36014B, and a CatalogueContent ("Content") package 36016B. The GlobalInformation package 36012B includes a ProviderPropertyValuation entity 36018B. The ProviderPropertyValuation entity 36018B is of type GDT 36322B PropertyValuation 36324B. There is any number 36320B of ProviderPropertyValuation entities 36018B for each Catalogue entity 36014A.

The ProviderPropertyValuation entity 36018B includes a PropertyReference 36328B and a PropertyValue 36348B. The PropertyReference 36328B is of type GDT 36332B PropertyReference 36334B. There is one 36330B PropertyReference 36328B for each ProviderPropertyValuation entity 36018B. The PropertyReference 36328B has one 36340B ID 36338B of type GDT 36342B PropertyID 36344B The PropertyValue 36348B is of type GDT 36352B PropertyValue 36354B. There is any number 36330B of PropertyValues 36348B for each ProviderPropertyValuation entity 36018B. The PropertyValue 36348B may include an AmountSpecification 36358B, a QuantitySpecification 36386B, a DecimalSpecification 36314C, a FloatSpecification 36340C, a IntegerSpecification 36368C, a DateTimeSpecification 36396C, a NameSpecification 36324D, and a IndicatorSpecification 36336D. For each PropertyValue 36348B, there is one or zero 36360B AmountSpecification 36358B, one or zero 36388B QuantitySpecification 36386B, one or zero 36316C DecimalSpecification 36314C, one or zero 36342C FloatSpecification 36340C, one or zero 36370C IntegerSpecification 36368C, one or zero 36398C DateTimeSpecification 36396C, one or zero 36326D NameSpecification 36324D, and one or zero 36338D IndicatorSpecification 36336D.

The AmountSpecification 36358B may include a one or zero 36364B of a Amount 36358B of type GDT 36366B Amount 36368B, one or zero 36372B of a LowerAmount 36370B of type GDT 36374B Amount 36376B and one or zero 36380B of an UpperAmount 36378B of type GDT 36382B Amount 36384B.

The QuantitySpecification 36386B may include a one or zero 36392B of a Quantity 36390B of type GDT 36394B Quantity 36396B, one or zero 36300C of a LowerQuantity 36398B of type GDT 36300C Quantity 36304C and one or zero 36308C of an UpperQuantity 36306C of type GDT 36310C Quantity 36312C.

The DecimalSpecification 36314C may include a one or zero 36319C of a DecimalValue 36318C of type GDT 36320C DecimalValue 36322C, one or zero 36326C of a LowerDecimalValue 36324C of type GDT 36328C DecimalValue 36330C and one or zero 36334C of an UpperDecimalValue 36332C of type GDT 36336C DecimalValue 36338C.

The FloatSpecification 36340C may include a one or zero 36346C of a FloatValue 36344C of type GDT 36348C FloatValue 36350C, one or zero 36354C of a LowerFloatValue 36352C of type GDT 36356C FloatValue 36358C and one or zero 36362C of an UpperFloatValue 36360C of type GDT 36364C FloatValue 36366C.

The IntegerSpecification 36368C may include a one or zero 36374C of a IntegerValue 36372C of type GDT 36376C IntegerValue 36378C, one or zero 36382C of a LowerIntegerValue 36380C of type GDT 36384C IntegerValue 36386C and one or zero 36390C of an UpperIntegerValue 36388C of type GDT 36392C IntegerValue 36394C.

The DateTimeSpecification 36396C may include a one or zero 36302D of a DateTime 36300D of type GDT 36304D DateTime 36306D, one or zero 36310D of a StartDateTime 36308D of type GDT 36312D DateTime 36314D and one or zero 36318D of an EndDateTime 36316D of type GDT 36320D DateTime 36322D.

The NameSpecification 36324D may include a one or zero 36302D of a Name 36328D, which is of type GDT 36332D Name 36334D that may include one or zero 36335D @languageCode 36333D. The IndicatorSpecification 36336D may include a one or zero 36342D of an Indicator 36340D, which is of type GDT 36344D Indicator 36346D.

Turning to FIG. 363I, the CatalogueModel package 36314B includes a CatalogueModel entity 36348D, which is of type GDT 36352D CatalogueModel 36354D. There is one or zero 36350D CatalogueModel entity for each Catalogue entity 36314A. The CatalogueModel entity 36348D includes a PropertyDataTypeListCompleteTransmissionIndicator 36356D of type GDT 36360D CompleteTransmissionIndicator 36362D, a PropertyListCompleteTransmissionIndicator 36364D of type GDT 36368D CompleteTransmissionIndicator 36370D, a CatalogueSectionTypeListCompleteTransmissionIndicator 36372D of type GDT 36376D CompleteTransmissionIndicator 36378D, and a CatalogueSchemaListCompleteTransmissionIndicator 36380D of type GDT 36384D CompleteTransmissionIndicator 36386D.

There is one or zero 36358D PropertyDataTypeListCompleteTransmissionIndicator 36356D for each CatalogueModel entity 36348D. There is one or zero 36366D PropertyListCompleteTransmissionIndicator 36364D for each CatalogueModel entity 36348D. There is one or zero 36374D CatalogueSectionTypeListCompleteTransmissionIndicator 36372D for each CatalogueModel entity 36348D. There is one or zero 36382D CatalogueSchemaListCompleteTransmissionIndicator 36380D for each CatalogueModel entity 36348D.

The CatalogueModel package 36314B also includes a PropertyDataType package 36388D, a Property package 36390D, a CatalogueSectionType package 36392D, and a CatalogueSchema package 36394D. The PropertyDataType package 36388D includes a PropertyDataType entity 36395D. The PropertyDataType entity 36395D is of type GDT 36397D PropertyDataType 36398D. There is any number 36396D of PropertyDataType entities 36395D for each CatalogueModel entity 36348D.

The PropertyDataType entity 36395D may include an @actionCode 36300E, an ID 36306E, a PreferredName 36314E that may include one or zero 36324E @languageCode, a FormatCode 36326E, a MaximumTotalDigitNumberValue 36334E, a FractionalDigitNumberValue 36342E, a ComponentProperty 36350E, and an AllowedPropertyValueElement 36378E. The @actionCode 36300E is of type GDT 36302E ActionCode 36304E. The ID 36306E is of type GDT 36310E PropertyDataTypeID 36312E. The PreferredName 36314E is of type GDT 36318E Name 36320E. The FormatCode 36326E is of type GDT36330E PropertyDataTypeFormatCode 36332E. The MaximumTotalDigitNumberValue 36334E is of type GDT 36338E DigitNumberValue 36340E. The FractionalDigitNumberValue 36342E is of type GDT 36046E DigitNumberValue 36348E.

For each PropertyDataType entity 36395D, there is one or zero 36301E @actionCode 36300E, one or zero 36308E ID 36306E, one or more 36316E PreferredNames 36314E, one 36328E FormatCode 36326E, one or zero 36336E MaximumTotalDigitNumberValue 36334E, one or zero 36344E FractionalDigitNumberValue 36342E, any number 36352E of Component Properties 36350E, and any number 36352E of AllowedPropertyValueElements 36378E.

In one implementation, each ComponentProperty 36350E includes one 36356E Reference 36354E of type GDT 36358D PropertyReference 36360E and any number 36372E of OrdinalNumberValues 36370E of type GDT 36374E OrdinalNumberValue 36376E. In this implementation, the Reference 36354E includes one 36364E ID 36362E of type GDT 36366E PropertyID 36368E. The AllowedPropertyValueElement 36378E may also include one 36384E PropertyValue 36382E of type GDT 36386E PropertyValue 36388E.

Turning to FIG. 363L, the Property package 36390D includes a Property entity 36392E of type GDT 36396E Property 36398E. There is zero or more 36394E Property entities 36392E for each CatalogueModel entity 36348D. Each Property entity 36392E includes an @actionCode 36302F, an ID 36310F, a PreferredName 36318F, a PropertyDataTypeReference 36326F, an AspectID 36346F, a TargetInterfaceElementID 36354F, a MultipleValueIndicator 36362F, a TextSearchableIndicator 36370F, a ParametricSearchableIndicator 36378F, and a ValuationRequiredIndicator 36388F. The @actionCode 36302F is of type GDT 36306F ActionCode 36308F. The ID 36310F is of type GDT 36314F PropertyID 36316F. The PreferredName 36318F is of type GDT 36322F Name 36324F. The PropertyDataTypeReference 36326F is of type GDT36330F PropertyDataTypeReference 36332F. The AspectID 36346F is of type GDT 36350F AspectID 36352F. The TargetInterfaceElementID 36354F is of type GDT 36058F InterfaceElementID 36360F. The MultipleValueIndicator 36362F is of type GDT 36066F PropertyMultipleValueIndicator 36368F. The TextSearchableIndicator 36370F is of type GDT 36074F TextSearchableIndicator 36376F. The ParametricSearchableIndicator 36378F is of type GDT 36082F PropertyParametricSearchableIndicator 36384F. The ValuationRequiredIndicator 36388F is of type GDT 36392F PropertyValuationRequiredIndicator 36394F.

For each Property entity 36390D, there is one or zero 36310F @actionCode 36308F, one or zero 36312F ID 36310F, one or more 36320F PreferredNames 36318F, one 36328F PropertyDataTypeReference 36326F, zero or more 36348F AspectIDs 36346F, zero or more 36356F TargetInterfaceElementID 36354F, one or zero 36364F MultipleValueIndicator 36362F, one or zero 36380F ParametricSearchableIndicator 36378F, and one or zero 36390F ValuationRequiredIndicator 36388F.

Turning to FIG. 363N, the CatalogueSectionType package 36392D includes a CatalogueSectionType entity 36394F. The CatalogueSectionType entity 36394F is of type GDT 36398F CatalogueSectionType 36300G. There is any number of CatalogueSectionType entities 36394F for each CatalogueModel entity 36348D. The CatalogueSectionType entity 36394F includes includes an @actionCode 36302G, an ID 36310G, a Name 36318G and a SectionProperty entity 36326G. The @actionCode 36302G is of type GDT 36306G ActionCode 36308G. The ID 36310G is of type GDT 36314G CatalogueSectionTypeID 36316G. The Name 36318G is of type GDT 36322G Name 36324G. The CatalogueSectionProperty entity 36326G is of type GDT 36330G CatalogueSectionTypeSectionProperty 36332G. For each CatalogueSectionType entity 36394F, there is one or zero 36304G @actionCode 36302G, one 36312G ID 36310G, zero or more 36320G Names 36318G and zero or more 36328G SectionProperty entities 36326G.

Each SectionProperty 36326G includes a PropertyReference 36334G and a OrdinalNumberValue 36352G. The PropertyReference 36334G is of type GDT 36338G PropertyReference 36340G and includes one 36346G ID 36344G of type 36348G PropertyID 36350G. The OrdinalNumberValue 36352G is of type GDT 36356G OrdinalNumberValue 36358G. In one implementation, for each SectionProperty 36326G, there is one 36336G PropertyReference 36334G and one 36354G OrdinalNumberValue 36352G.

The CatalogueSchema package 36394D includes a CatalogueSchema entity 36360G. The CatalogueSchema entity 36360G is of type GDT 36364G CatalogueSchema 36366G. There is any number 36362G CatalogueSchema entities 36360G for each CatalogueModel entity 36348D. The CatalogueSchema entity 36360G includes an @ActionCode 36368G, an ID 36376G, a TypeCode 36384G, a Name 36392G, a CatalogueSectionListCompleteTransmissionIndicator 36300H, a CatalogueSectionRelationshipListCompleteTransmissionIndicator 36308H, a CatalogueItemProperty entity 36316H, a Catalogue Section entity 36350H, and a CatalogueSectionRelationship entity 36330I. The @ActionCode 36368G is of type GDT36372G ActionCode 36374G. The ID 36376G is of type GDT 36380G CatalogueSchemaID 36382G. The TypeCode 36384G is of type GDT 36388G CatalogueSchemaTypeCode 36390G. The Name 36392G is of type GDT 36396G Name 36398G. The CatalogueSectionListCompleteTransmissionIndicator 36300H is of type GDT 36304H CompleteTransmissionIndicator 36306H. The CatalogueSectionRelationshipListCompleteTransmissionIndicator 36308H is of type GDT 36312H CompleteTransmissionIndicator 36314H. The CatalogueItemProperty entity 36316H is of type GDT 36320H CatalogueSchemaCatalogueItemProperty 36322H. The CatalogueSection entity 36350H is of type GDT 36354H CatalogueSection 36356H. The CatalogueSectionRelationship entity 36330I is of type GDT 36334I CatalogueSectionRelationship 36335I.

For each CatalogueSchema entity 36360G, there is one or zero 36370G @ActionCodes 36368G, one 36378G ID 36376G, one or zero 36386G TypeCode, zero or more 36394G Names 36392G, one or zero 36302H CatalogueSectionListCompleteTransmissionIndicator 36300H, one or zero 36310H CatalogueSectionRelationshipListCompleteTransmissionIndicator 36308H, any number 36318H of CatalogueItem Property entities 36316H, any number 36352H of CatalogueSection entitites 36350H, and any number 36332I of CatalogueSectionRelationship entities 36330I.

Each CatalogueItemProperty entity 36316H includes a PropertyReference 36324H and a OrdinalNumberValue 36342H. The PropertyReference 36324H is of type GDT 36328H PropertyReference 36330H and includes one 36336H ID 36334H of type GDT 36338H PropertyID 36340H. The OrdinalNumberValue 36342H is of type GDT 36346H OrdinalNumberValue 36348H. In one implementation, for each CatalogueItemProperty entity 36316H, there is one 36326H PropertyReference 36330H and one 36344H OrdinalNumberValue 36342H.

Each CatalogueSection entity 36350H may include an @actionCode 36358H, an ID 36366H, a TypeID 36374H, a Name 36382H, a PropertyValuation entity 36390H, and a CatalogueItemProperty entity 36300I. The @actionCode 36358H is of type GDT 36362H ActionCode 36364H. The ID 36366H is of type GDT 36368H CatalogueSectionID 36370H. The TypeID 36374H is of type GDT 36378H CatalogueSectionTypeID 36380H. The Name 36382H is of type GDT 36386H Name 36388H. The PropertyValuation entity 36390H is of type GDT 36394H PropertyValuation 36396H. The CatalogueItemProperty entity 36300I is of type GDT 36304I CatalogueSectionCatalogueItemProperty 36306I. For each CatalogueSection entity 36350H, there is one or zero 36360H @actionCode 36358H, one 36368H ID 36366H, one or zero 36376H TypeID 36374H, zero or more 36384H Names 36382H, zero or more 36392H PropertyValuation entities 36390H, and zero or more 36302I CatalogueItemProperty entities 36300I.

Each CatalogueItemProperty entity 36300I of a respective CatalogueSection entity 36350H includes a PropertyReference 36308I and a OrdinalNumberValue 36324I. The PropertyReference 36308I is of type GDT 36312I PropertyReference 36314I and includes one 36320I ID 36318I of type GDT 36322I PropertyID 36323I. The OrdinalNumberValue 36324I is of type GDT 36328I OrdinalNumberValue 36329I. In one implementation, for each CatalogueItemProperty entity 36300I, there is one 36310I PropertyReference 36308I and one 36326I OrdinalNumberValue 36324I.

Each CatalogueSectionRelationship entity 36330I includes an @actionCode 36336I, a SourceCatalogueSectionID 36344I, and a TargetCatalogueSectionID 36352I. The @actionCode 36336I is of type GDT 36340I ActionCode 36342I. The SourceCatalogueSectionID 36344I is of type GDT 36342I CatalogueSectionID 36350I. The TargetCatalogueSectionID 36352I is of type GDT 36356I CatalogueSectionID 36358I. For each CatalogueSectionRelationship entity 36330I, there is one or zero 36338I @actionCode 36336I, one 36346I SourceCatalogueSectionID 36344I, and one 36354I TargetCatalogueSectionID 36352I.

The Content or CatalogueContent package 36316B includes a CatalogueContent entity 36360I. The CatalogueContent entity 36360I is of type GDT 36364I CatalogueSectionID 36366I. There is one or zero 36362I for each Catalogue entity 36314A. The CatalogueContent entity 36360I includes a CatalogueItemListCompleteTransmissionIndicator 36368I, a CatalogueItemRelationshipListCompleteTransmissionIndicator 36376I, a CatalogueViewListCompleteTransmissionIndicator 36384I, and a CatalogueSchemaID 36392I. The CatalogueItemListCompleteTransmissionIndicator 36368I is of type GDT 36372I CompleteTransmissionIndicator 36374I. The CatalogueItemRelationshipListCompleteTransmissionIndicator 36376I is of type GDT 36380I CompleteTransmissionIndicator 36382I. The CatalogueViewListCompleteTransmissionIndicator 36384I is of type GDT 36388I CompleteTransmissionIndicator 36390I. The CatalogueSchemaID 36392I is of type GDT 36396I CatalogueSchemaID 36398I. In one implementation, for each Catalogue entity 36314A, there is one or zero 36370I CatalogueItemListCompleteTransmissionIndicator 36368I, one or zero 36378I CatalogueItemRelationshipListCompleteTransmissionIndicator 36376I, one or zero 36386I CatalogueViewListCompleteTransmissionIndicator 36384I, and one or zero 363941 CatalogueSchemaID 36392I The Content or CatalogueContent package 36316B also includes a CatalogueItem package 36300J and a CatalogueView package 36301J. The CatalogueItem package 36300J includes a CatalogueItem entity 36302J. The CatalogueItem entity 36302J is of type GDT 36306J CatalogueItem 36308J. There is any number 36304J of CatalogueItem entities 36302J for each Catalogue entity 36314A. The CatalogueItem entity 36302J may include an @actionCode 36310J, an ID 36318J, a CatalogueItemDescription entity 36326J, a CatalogueItemClassification entity 36334J, and a CatalogueItemPropertyValuation entity 36358J. The @actionCode 36310J is of type GDT 36314J ActionCode 36316J. The ID 36318J is of type GDT 36322J CatalogueSectionID 36324J. The CatalogueItemDescription entity 36326J is of type GDT 36330J Description 36332J. The CatalogueItemClassification entity 36334J is of type GDT 36338J CatalogueItemClassification 36340J. The CatalogueItemPropertyValuation entity 36358J is of type GDT 36362J PropertyValuation 363964J. For each CatalogueItem entity 36302J, there is one or zero 36312J @actionCode 36310J, one 36320J ID 36318J, any number 36328J of CatalogueItemDescription entities 36326J, any number 36334J of CatalogueItemClassification entities 36334J, and any number 36360J of PropertyValuation entities 36358J.

Each CatalogueItemClassification entity 36334J includes a CatalogueSchemaID 36342J and a CatalogueSectionID 36350J. The CatalogueSchemaID 36342J is of type GDT 36346J CatalogueSchemaID 36348J. The CatalogueSectionID 36350J is of type GDT 36354J CatalogueSectionID 36356J. For each CatalogueItemClassification entity 36334J, there is one or zero 36344J CatalogueSchemaID 36342J and one 36352J CatalogueSectionID 36350J.

The CatalogueItem package 36300J also includes a CatalogueItemRelationship entity 36368J. The CatalogueItemRelationship entity 36368J is of type GDT 36372J CatalogueItemRelationship 36374J. There is any number 36370J of CatalogueItemRelationship entities 36368J for each Catalogue entity 36314A. The CatalogueItemRelationship entity 36368J includes an @actionCode 36376J, a SourceCatalogueItemID 36384J, a TargetCatalogueItemID 36392J, and a TypeCode 36300K. The @actionCode 36376J is of type GDT 36380J ActionCode 36382J. The SourceCatalogueItemID 36384J is of type GDT 36388J CatalogueItemID 36390J. The TargetCatalogueItemID 36392J is of type GDT 36396J CatalogueItemID 36398J. The TypeCode 36300K is of type GDT 36304K ObjectStructureRelationshipTypeCode 36306K. In one implementation, for each CatalogueItemRelationship entity 36368J, there is one or zero 36378J @actionCode 36376J, one 36386J SourceCatalogueItemID 36384J, one 36394J TargetCatalogueItemID 36392J, and one 36302K TypeCode 36300K.

The CatalogueView package 36301J includes a CatalogueView entity 36308K. The CatalogueView entity 36308K is of type GDT 36312K CatalogueView 36314K. There is any number 36310K of CatalogueView entities 36308K for each CatalogueContent entity 36360I. The CatalogueView entity 36308K may include an @actionCode 36316K, an ID 36324K, a Name 36332K, an ItemListCompleteTransmissionIndicator 36340K, an ItemRelationshipTypeListCompleteTransmissionIndicator 36348K, an ExcludedPropertyListCompleteTransmissionIndicator 36356K, a CatalogueViewSchema or Schema entity 36364K, a CatalogueViewItem or Item entity 36312L and a CatalogueViewItemRelationshipType entity or ItemRelationshipType 36336L. The @actionCode 36316K is of type GDT 36320K ActionCode 36322K. The ID 36324K is of type GDT 36328K CatalogueViewID 36330K. The Name 36340K is of type GDT 36336K GDT Name 36338K. The ItemListCompleteTransmissionIndicator 36340K is of type GDT 36344K CompleteTransmissionIndicator 36346K. The ItemRelationshipTypeListCompleteTransmissionIndicator 36348K is of type GDT 36352K CompleteTransmissionIndicator 36354K. The ExcludedPropertyListCompleteTransmissionIndicator 36356K is of type GDT 36360K CompleteTransmissionIndicator 36362K. The CatalogueViewSchema entity 36364K is of type GDT 36368K CatalogueViewSchema 36370K. The CatalogueViewItem 36312L is of type GDT 36316L CatalogueViewItem 36318L. The CatalogueViewItemRelationshipType entity 36336L is of type GDT 36340L CatalogueViewItemRelationshipType 36342L. In one implementation, for each CatalogueView entity 36308K, there is one or zero 36318K @actionCode 36316K, one 36326K ID 36324K, zero or more 36334K Names 36332K, one or zero 36342K ItemListCompleteTransmissionIndicator 36340K, one or zero 36350K ItemRelationshipTypeListCompleteTransmissionIndicator 36348K, one or zero 36358K ExcludedPropertyListCompleteTransmissionIndicator 36356K, any number 36366K of CatalogueViewSchema entities 36364K, any number 36314L of CatalogueViewItem entities 36312L and any number 36338L of CatalogueViewItemRelationshipType entities 36336L.

The CatalogueViewSchema entity 36364K includes a SectionListCompleteTransmissionIndicator 36372K, a CatalogueSchemaID or ID 36380K and a CatalogueViewSchemaSection or Section entity 36388K. The SectionListCompleteTransmissionIndicator 36372K is of type GDT 36376K CompleteTransmissionIndicator 36378K. The ID 36380K is of type GDT 36384K CatalogueSchemaID 36386K. The CatalogueViewSchemaSection 36388K is of type GDT 36392K CatalogueSchemaID 36380K. In one implementation, for each CatalogueViewSchema entity 36364K, there is one or zero 36374K SectionListCompleteTransmissionIndicator 36372K, one 36382K ID 36380K and any number 36390K of CatalogueViewSchemaSection entities 36388K.

Each CatalogueViewSchemaSection entity 36388K includes an @actionCode 36396K and a CatalogueSectionID or ID 36304L. The @actionCode 36396K is of type GDT 36300L ActionCode 36302L. The ID 36304L is of type GDT 36308L CatalogueSectionID 36310L. In one implementation, for each CatalogueViewSchemaSection entity 36388K, there is one or zero 36398K @actionCode 36396K and one 36306L ID 36304L.

The CatalogueViewItem entity 36312L includes an @actionCode 36320L and a CatalogueItemID or ID 36328L. The @actionCode 36320L is of type GDT 36324L ActionCode 36326L. The ID 36328L is of type GDT 36332L CatalogueItemID 36334L. In one implementation, for each CatalogueViewItem entity 36312L, there is one or zero 36322L @actionCode 36320L and one 36330L ID 36328L.

The CatalogueViewItemRelationshipType entity 36336L includes an @actionCode 36344L and a CatalogueItemRelationshipTypeCode 36352L. The @actionCode 36344L is of type GDT 36348L ActionCode 36350L and the CatalogueViewItemRelationshipType entity 36336L is of type GDT 36356L ObjectStructureRelationshipTypeCode 36358L. In one implementation, for each CatalogueViewItemRelationshipType entity 36336L, there is one or zero 36346L @actionCode 36344L and one 36354L CatalogueItemRelationshipTypeCode 36352L.

The CatalogueViewExcludedProperty or Excluded Property 36360L includes an @actionCode 36368L and a PropertyReference 36376L that may have one 36388L ID 36386L. The @actionCode 36368L is of type GDT 36372L ActionCode 36374L. The PropertyReference 36376L is of type GDT 36380L PropertyReference 36382L. The ID 36386L is of type GDT 36390L PropertyID 3639L. In one implementation, for each CatalogueViewExcludedProperty 36360L, there is one or zero 36370L @actionCode 36368L and one 36378L PropertyReference 36376L.

(7) Message Data Type Catalogue Publication Transmission Package Message

Figure 364:
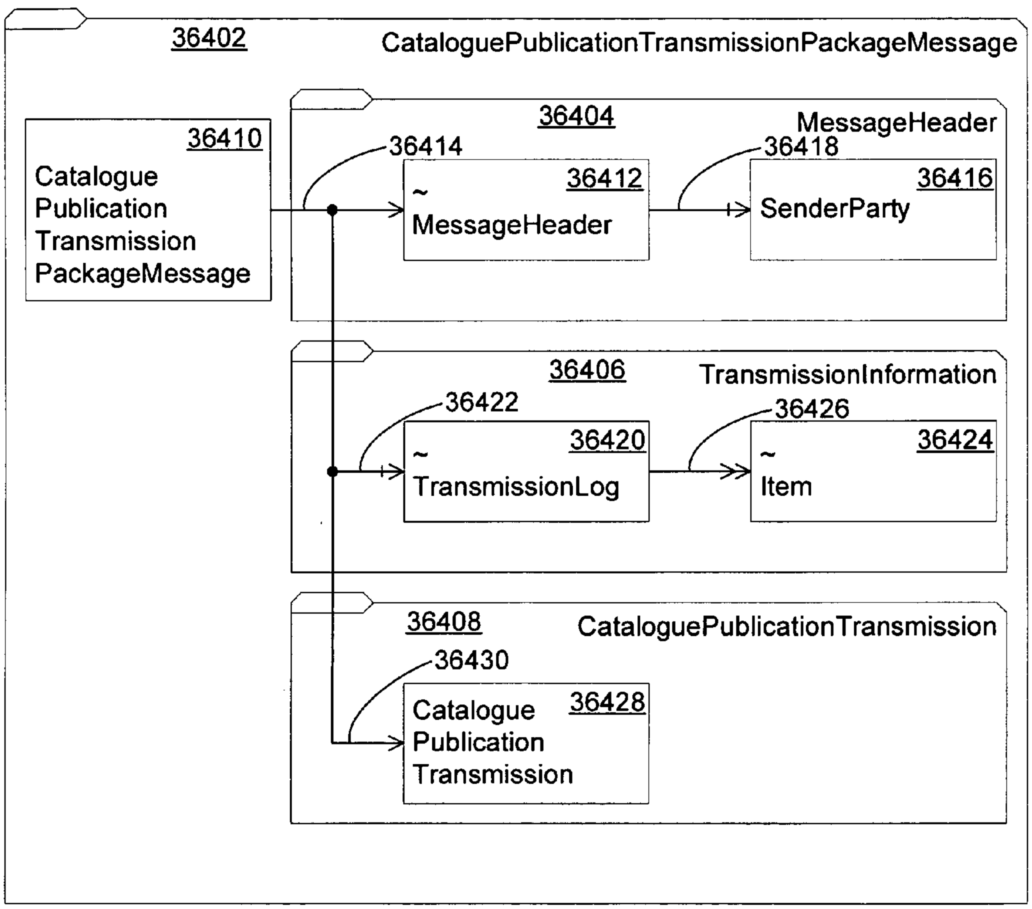
FIG. 364 depicts the data model for the message data type CataloguePublicationTransmissionPackage message used to implement a CataloguePublicationTransmissionPackageNotification message.

The data model for the message data type CataloguePublicationTransmissionPackage Message used to implement a CataloguePublicationTransmissionPackageNotification message 35912 is depicted in FIG. 364. The message data type CataloguePublicationTransmissionPackageMessage includes a CataloguePublicationTransmissionPackageMessage package 36402. The CataloguePublicationTransmissionPackageMessage package 36402 includes a MessageHeader package 36404, a TransmissionInformation package 36406, a CataloguePublicationTransmission 36408, and a CataloguePublicationTransmissionPackageMessage object or entity 36410.

(a) Message Header Package

The MessageHeader package 36404 groups the business-related information relevant for sending a Business Document in a message. The MessageHeader package 36404 includes a MessageHeader entity 36412 and a SenderParty entity 36416. There is a 1:1 relationship 36414 between the MessageHeader entity 36412 and the CatalogueUpdateMessage entity 36410. There is a 1:c relationship 36418 between the MessageHeader entity 36412 and the SenderParty entity 36416.

As discussed above, the MessageHeader entity 36412 groups the business-related information from the sending application's point of view for identifying the Business Document in a message, information about the sender, and potentially information about the receiver. The MessageHeader entity 36412 is of type GDT BusinessDocumentMessageHeader.

The SenderParty entity 36416 is the party responsible for sending of a business document on a business-related application level. The SenderParty entity 36416 is of type GDT BusinessDocumentMessageHeaderParty.

(b) Transmission Information Package

The TransmissionInformation package 36406 groups the information pertaining to the transmission of the object or entity (e.g., the CataloguePublicationTransmissionPackageMessage entity 36410) included in the message. The TransmissionInformation package 36406 includes a TransmissionLog entity 36420, which is a collection of events that occurred during processing of the transmitted business document object. The TransmissionLog is subdivided into one or more TransmissionLogItem ("Item") entities 36424. Each TransmissionLogItem entity 36424 provides information about an event that occurred during processing of the respective transmitted business document object. Each TransmissionLogItem entity 36424 is of type GDT:LogItem. The MinimumRequestedLogItemSeverityCode stated in message CataloguePublicationRequest 35910 determines which LogItems are to be returned by specifying their severity. There is a 1:c relationship 36422 between the the CataloguePublicationTransmissionPackageMessage entity 36410 and the TransmissionLog entity 36420 and a 1:n relationship 36426 between the TransmissionLog entity 36420 and each TransmissionLogItem entity 36424. A TransmissionLog entity 36420 provides information about the identification of a transmission.

(c) Catalogue Publication Transmission Package

The CataloguePublicationTransmission package 36408 groups information pertaining to a Catalogue publication transmission. The CataloguePublicationTransmission package 36408 includes a CataloguePublicationTransmission entity 36428. There is a 1:1 relationship 36430 between the CatalogueUpdateMessage entity 36410 and the CataloguePublicationTransmission entity 36428.

(i) CataloguePublicationTransmission entity

The CataloguePublicationTransmission entity 36428 specifies a package of a catalogue publication transmission (e.g., all or portion of a CataloguePublicationRequest message 35910) and information about the reception of this package and the validity of the package's content. The CataloguePublicationTransmission entity 36428 includes an ID, a PackageOrdinalNumberValue, and a PackageCompletedIndicator. The ID is of type GDT:TransmissionID and identifies the transmission to which the package belongs. The PackageOrdinalNumberValue is of type GDT:OrdinalNumberValue and identifies the package in the transmission. The PackageCompletedIndicator is of type GDT:BusinessTransactionCompletedIndicator and specifies whether the transmission package sent as part of a CataloguePublicationRequest message 35910 was successfully received and if the package includes valid data or not.

(d) Message Data Type—Element Structure

FIGS. 365A-B depict the element structure for a CataloguePublicationTransmissionPackageNotification message 35912. The element structure is similar to the above described data model of the message data type CataloguePublicationTransmissionPackageNotification message as reflected in FIG. 364, but provides additional information regarding the details for interfacing with or implementing a CataloguePublicationTransmissionPackageMessage, such as a CataloguePublicationTransmissionPackageNotification message 35912. As shown in FIG. 365A, the element structure identifies the different packages 36500 that may be in a respective CataloguePublicationTransmissionPackageNotification message 35912. The element structure for the CataloguePublicationTransmissionPackageNotification message 35912 includes three levels 36502, 36504 and 36506 each of which is associated with a respective package 36500. The element structure identifies the occurrence or cardinality 36508 and data type information (i.e., type 36510 and name 36512) for the elements at the respective levels 36502, 36504, and 36506.

The outermost package of this interface is a CataloguePublicationTransmissionPackageMessage package 36516, which includes a CataloguePublicationTransmissionPackageMessage entity 36518 at the first level 36502. The CataloguePublicationTransmissionPackageMessage entity 36518 is of generic data type ("GDT") 36520 CataloguePublicationTransmissionPackageMessage 36522.

The CataloguePublicationTransmissionPackageMessage package 36516 includes a MessageHeader package 36524, a TransmissionInformation package 36526, and a CataloguePublicationTransmission package 36528. The MessageHeader package 36524 includes a MessageHeader entity 36530, which is of type GDT 36534 BusinessDocumentMessageHeader 36536. There is one 36532 MessageHeader entity 36530 for each CataloguePublicationTransmissionPackageMessage entity 36518.

The MessageHeader entity 36530 includes an ID 36540 and a CreationDateTime 36548. The ID 36540 is of type GDT 36544 BusinessDocumentMessageID 36546. The CreationDateTime 36548 is of type GDT 36552 DateTime 36554. There is one 36542 ID 36540 for each MessageHeader entity 36530 and one 36550 CreationDateTime 36548 for each MessageHeader entity 36530.

The MessageHeader entity 36530 also includes a SenderParty entity 36556. The SenderParty entity 36556 is of type GDT 36560 BusinessDocumentMessageHeaderParty 36562. There is one or zero 36558 SenderParty entity 36556 for each MessageHeader entity 36530.

The TransmissionInformation package 36526 includes a TransmissionLog 36564. There is one or zero 36176 TransmissionLog 36564 for each CataloguePublicationTransmissionPackageMessage entity 36518. The TransmissionLog 36564 includes an Item 36568 of type GDT 36572 LogItem 36574. There is one or more 36570 Items 36568 for each TransmissionLog 36564.

The CataloguePublicationTransmission package 36528 includes a CataloguePublicationTransmission entity 36576. The CataloguePublicationTransmission entity 36576 is of type GDT 36580 CataloguePublicationTransmissionPackage 36582. There is one 36578 CataloguePublicationTransmission entity 36576 for each CataloguePublicationTransmissionPackageMessage entity 36518. The CataloguePublicationTransmission entity 36576 includes an ID 36584, a PackageOrdinalNumberValue 36592, and a PackageCompletedIndicator 36500A. The ID 36584 is of type GDT 36588 TransmissionID 36590. The PackageOrdinalNumberValue 36592 is of type GDT 36596 OrdinalNumberValue 36598. The PackageCompletedIndicator 36500A is of type GDT 36504A BusinessTransactionCompletedIndicator 36506A. There is one 36586 ID 36584 for each CataloguePublicationTransmission entity 36576. There is one 36594 PackageOrdinalNumberValue 36592 for each CataloguePublicationTransmission entity 36576. There is one 36502A PackageCompleted Indicator 36500A for each CataloguePublicationTransmission entity 36576.

(8) Message Data Type Catalogue Publication Confirmation Message

Figure 366:
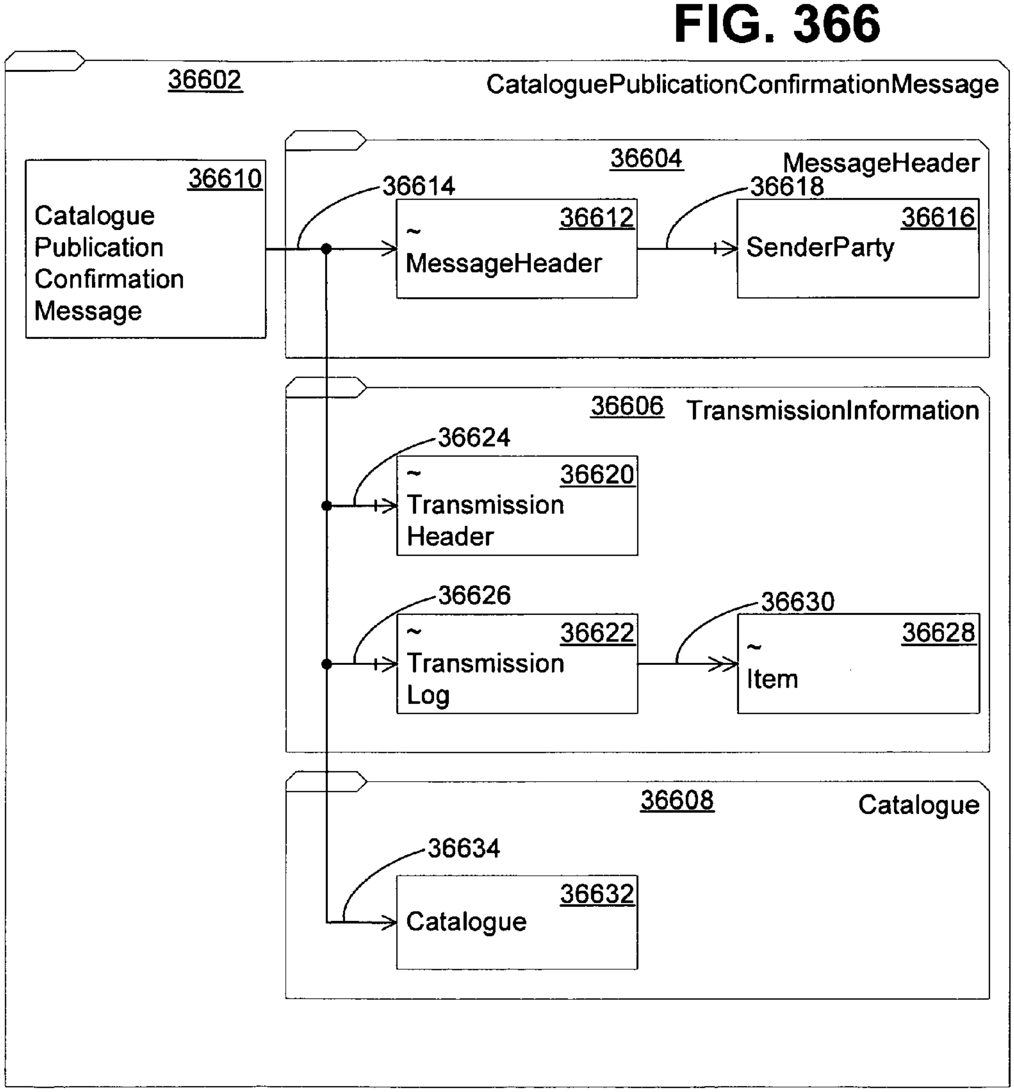
FIG. 366 depicts the data model for the message data type CataloguePublicationConfirmationMessage used to implement a CataloguePublicationConfirmation message.

The data model for the message data type CataloguePublicationConfirmationMessage used to implement a CataloguePublicationConfirmation message 35914 is depicted in FIG. 366A. The message data type CataloguePublicationConfirmationMessage includes a CataloguePublicationConfirmationMessage package 36602. The CataloguePublicationConfirmationMessage package 36602 includes a MessageHeader package 36604, a TransmissionInformation package 36506, a Catalogue package 36608, and a CataloguePublicationConfirmationMessage object or entity 36610.

(a) Message Header Package

The MessageHeader package 36604 includes a MessageHeader entity 36612 and a SenderParty entity 36616. There is a 1:1 relationship 36614 between the MessageHeader entity 36612 and the CataloguePublicationConfirmationMessage entity 36610. There is a 1:c relationship 36618 between the MessageHeader entity 36612 and the SenderParty entity 36616.

As discussed above, the MessageHeader entity 36612 groups the business-related information from the sending application's or business entity's point of view for identifying the Business Document in a message, information about the sender, and potentially information about the receiver. The MessageHeader entity 36612 is of type GDT BusinessDocumentMessageHeader.

The SenderParty entity 36616 is the party responsible for sending of a business document on a business-related application level. The SenderParty entity 36616 is of type GDT BusinessDocumentMessageHeaderParty.

(b) Transmission Information Package

The TransmissionInformation package 36606 groups the information pertaining to the transmission of the object or entity (e.g., the CataloguePublicationConfirmationMessage entity 36610) included in the message. The TransmissionInformation package 36606 includes a TransmissionHeader entity 36620 and a TransmissionLog entity 36622. The TransmissionHeader entity 36620 provides information about the identification of a transmission. The TransmissionHeader entity 36620 includes an ID of type GDT:TransmissionID. The TransmissionLog entity 36622 is a collection of events that occurred during processing of the transmitted business document object (e.g., the CataloguePublicationConfirmationMessage entity 36610). There is a 1:c relationship 36624 between the CataloguePublicationConfirmationMessage entity 36610 and the TransmissionHeader entity 36620. There is also a 1:c relationship 36626 between the CataloguePublicationConfirmationMessage entity 36610 and the TransmissionLog entity 36622. The TransmissionLog is subdivided into one or more TransmissionLogItem ("Item") entities 36628. Each TransmissionLogItem entity 36628 provides information about an event that occurred during processing of a CataloguePublicationRequest message 35910. Each TransmissionLogItem entity 36628 is of type GDT:LogItem. The MinimumRequestedLogItemSeverityCode stated in message CataloguePublicationRequest 35910 determines which LogItems are to be returned by specifying their severity. There is a 1:n relationship 36630 between the TransmissionLog entity 36622 and each TransmissionLogItem entity 36628.

(c) Catalogue Package

The catalogue package 36608 groups the information pertaining to a catalogue. The catalogue package 36608 includes a Catalogue entity 36632. There is a 1:1 relationship 36634 between the CataloguePublicationConfirmationMessage entity 36610 and the Catalogue entity 36632.

(i) CataloguePublicationTransmission Entity

The Catalogue entity 36632 in a CataloguePublicationConfirmation message 36614 provides confirmation whether the publication or deletion of a catalogue was successful or not. The Catalogue entity 36632 includes an ID and a PackageCompletedIndicator. The ID is of type GDT:CatalogueID and identifies the catalogue upon which publication or deletion is being confirmed. The PublicationCompletedIndicator is of type GDT BusinessTransactionCompletedIndicator and specifies whether the publishing or deletion of the catalogue was successful or not.

(d) Message Data Type—Element Structure

FIGS. 367A-B depict the element structure for a CataloguePublicationConfirmation message 35914. The element structure is similar to the above described data model of the message data type CataloguePublicationConfirmationMessage as reflected in FIG. 366, but provides additional information regarding the details for interfacing with or implementing a CataloguePublicationConfirmationMessage, such as a CataloguePublicationConfirmation message 35914. As shown in FIG. 367A, the element structure identifies the different packages 36700 that may be in a respective CataloguePublicationConfirmation message 35914. The element structure for the CataloguePublicationConfirmation message 35914 includes three levels 36702, 36704 and 36706 each of which is associated with a respective package 36700. The element structure identifies the occurrence or cardinality 36708 and data type information (i.e., type 36710 and name 36712) for the elements at the respective levels 36702, 36704, and 36706.

The outermost package of this interface is a CataloguePublicationConfirmationMessage package 36716, which includes a CataloguePublicationConfirmationMessage entity 36718 at the first level 36702. The CataloguePublicationConfirmationMessage entity 36718 is of generic data type ("GDT") 36720 CataloguePublicationConfirmationMessage 36722.

The CataloguePublicationConfirmationMessage package 36716 includes a MessageHeader package 36724, a TransmissionInformation package 36726, and a Catalogue package 36728. The MessageHeader package 36724 includes a MessageHeader entity 36730, which is of type GDT 36734 BusinessDocumentMessageHeader 36736. There is one 36732 MessageHeader entity 36730 for each CataloguePublicationConfirmationMessage entity 36718.

The MessageHeader entity 36730 includes an ID 36740 and a CreationDateTime 36748. The ID 36740 is of type GDT 36744 BusinessDocumentNessageID 36746. The CreationDateTime 36748 is of type GDT 36752 DateTime 36754. There is one 36742 ID 36740 for each MessageHeader entity 36730 and one 36750 CreationDateTime 36748 for each MessageHeader entity 36730.

The MessageHeader entity 36730 also includes a SenderParty entity 36756. The SenderParty entity 36756 is of type GDT 36760 BusinessDocumentMessageHeaderParty 36762. There is one or zero 36758 SenderParty entity 36756 for each MessageHeader entity 36730.

The TransmissionInformation package 36726 includes a TransmissionHeader entity 36764. The TransmissionHeader entity 36764 is of type GDT 36768 BusinessDocumentTransmissionHeader 36770. There is one or zero 36766 TransmissionHeader entity 36764 for each CataloguePublicationConfirmationMessage entity 36718. The TransmissionHeader entity 36764 includes one 36776 ID 36774 of type GDT 36778 TransmissionID 36780.

The TransmissionInformation package 36726 also includes a TransmissionLog entity 36782. There is one or zero 36784 TransmissionLog entities 36782 for each CataloguePublicationConfirmationMessage entity 36718. The TransmissionLog 36782 includes an Item 36786 of type GDT 36790 LogItem 36792. There is one or more 36788 Items 36786 for each TransmissionLog 36782.

The Catalogue package 36728 includes a Catalogue entity 36794. The Catalogue entity 36794 is of type GDT 36798 CataloguePublicationConfirmation 36700A. There is one 36796 Catalogue entity 36794 for each CataloguePublicationConfirmationMessage entity 36718. The Catalogue entity 36794 includes an ID 36702A, and a PackageCompletedIndicator 36710A. The ID 36702A is of type GDT 36706A CatalogueID 36708A. The PackageCompletedIndicator 36710A is of type GDT 36714A BusinessTransactionCompletedIndicator 36716A. There is one 36704A ID 36702A for each Catalogue entity 36794. There is one 36712A PackageCompleted Indicator 36710A for each Catalogue entity 36794.

Figure 368:
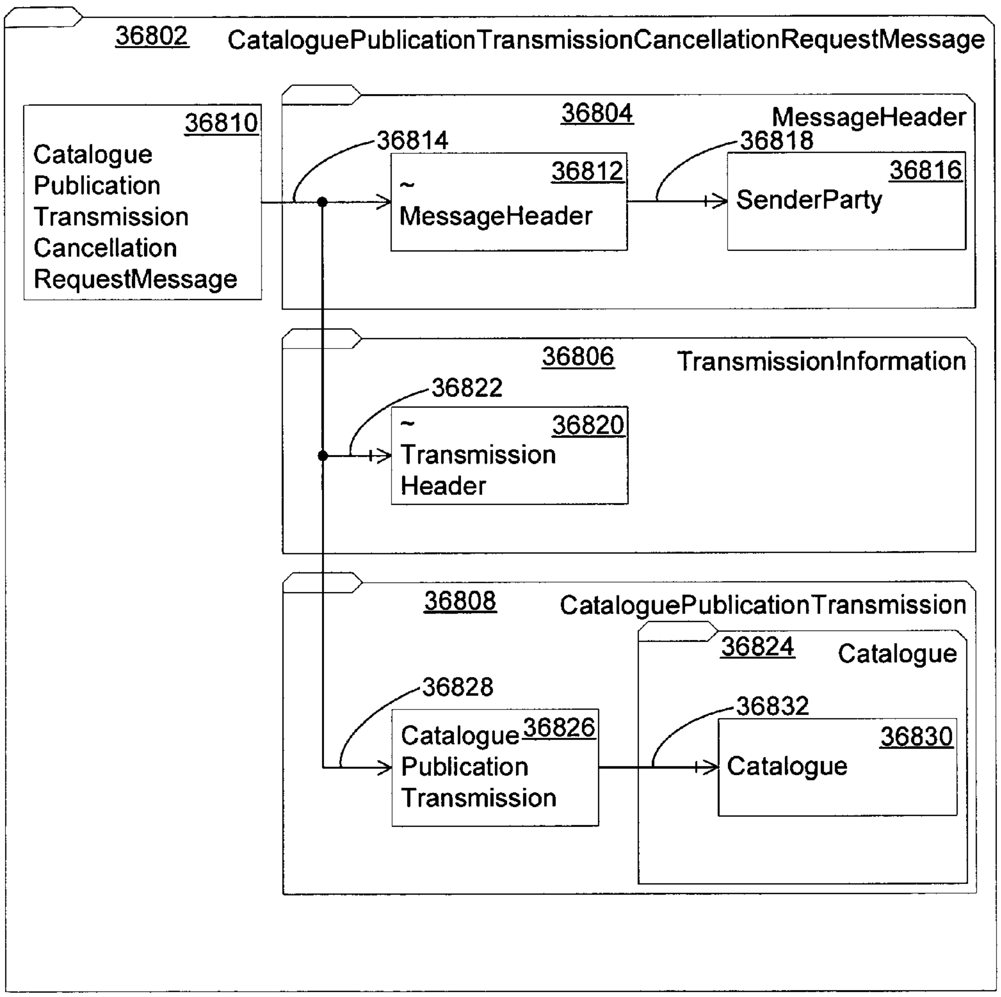
FIG. 368 depicts the data model for the message data type CataloguePublicationTransmissionCancellationRequestMessage used to implement a CataloguePublicationTransmissionCancellationRequest message.

(9) Message Data Type Catalogue Publication Transmission Cancellation Request Message The data model for the message data type CataloguePublicationTransmissionCancellation RequestMessage used to implement a CataloguePublicationTransmissionCancellationRequest message 35916 is depicted in FIG. 368A. The message data type CataloguePublicationTransmissionCancellationRequestMessage includes a CataloguePublicationTransmissionCancellationRequestMessage package 36802. The CataloguePublicationTransmissionCancellationRequestMessage package 36802 includes a MessageHeader package 36804, a TransmissionInformation package 36506, a CataloguePublicationTransmission package 36808, and a CataloguePublicationTransmissionCancellationRequestMessage object or entity 36810.

(a) Message Header Package

The MessageHeader package 36804 includes a MessageHeader entity 36812 and a SenderParty entity 36816. There is a 1:1 relationship 36814 between the MessageHeader entity 36812 and the CataloguePublicationTransmissionCancellationRequestMessage entity 36810. There is a 1:c relationship 36818 between the MessageHeader entity 36812 and the SenderParty entity 36816.

As discussed above, the MessageHeader entity 36812 groups the business-related information from the sending application's or business entity's point of view for identifying the Business Document in a message, information about the sender, and potentially information about the receiver. The MessageHeader entity 36812 is of type GDT BusinessDocumentMessageHeader.

The SenderParty entity 36816 is the party responsible for sending of a business document on a business-related application level. The SenderParty entity 36816 is of type GDT BusinessDocumentMessageHeaderParty.

(b) Transmission Information Package

The TransmissionInformation package 36806 groups the information pertaining to the transmission of the object or entity (e.g., the CataloguePublicationTransmissionCancellationRequestMessage entity 36810) included in the message. The TransmissionInformation package 36806 includes a TransmissionHeader entity 36820. The TransmissionHeader entity 36820 provides information about the identification of a transmission. The TransmissionHeader entity 36820 includes a MinimalRequestedLogItemSeverityCode of type GDT:LogItemSeverityCode. The MininmalRequestedLogItemSeverityCode specifies the severity of log items to returned by a CataloguePublicationTransmissionCancellationConfirmation message 35918. There is a 1:c relationship 36822 between the CataloguePublicationTransmissionCancellationRequestMessage entity 36810 and the TransmissionHeader entity 36820.

(c) CataloguePublicationTransmission Package

The CataloguePublicationTransmission package 36808 groups the information pertaining to a catalogue publication transmission. The CataloguePublicationTransmission package 36808 includes a Catalogue package 36824 and a CataloguePublicationTransmission entity 36826. There is a 1:1 relationship 36828 between the CataloguePublicationTransmissionCancellationRequestMessage entity 36810 and the CataloguePublicationTransmission entity 36826.

(i) CataloguePublicationTransmission Entity

The CataloguePublicationTransmission entity 36826 in a CataloguePublicationTransmissionCancellationRequest message 36814 is the request to cancel the transmission of a catalogue and to restore an earlier published state (if such exists) of the catalogue. Moreover, no more packages are sent for this transmission. The CataloguePublicationTransmission entity 36826 includes an ID of type GDT:TransmissionID that identifies the catalogue transmission of the original catalogue publication request.

(ii) Catalogue Package

The Catalogue package 36824 groups the information pertaining to the catalogue to be restored. The Catalogue package 36824 includes a Catalogue entity 36830. There is a 1:1 relationship 36832 between the CataloguePublicationTransmission entity 36826 and the Catalogue entity 36830.

(iii) Catalogue

The Catalogue entity 36830 specifies the information about a catalogue necessary in the context of a CataloguePublicationTransmissionCancellationRequest so that, for example, the Catalogue Search Engine is able to restore the catalogue identified by the Catalogue entity 36830. The Catalogue entity 36830 includes an ID of type GDT:CatalogueID, which identifies the catalogue.

(d) Message Data Type—Element Structure

FIGS. 369A-B depict the element structure for a CataloguePublicationTransmissionCancellationRequest message 35916. The element structure is similar to the above described data model of the message data type CataloguePublicationTransmissionCancellationRequestMessage as reflected in FIG. 368A, but provides additional information regarding the details for interfacing with or implementing a CataloguePublicationTransmissionCancellationRequestMessage data type, such as a CataloguePublicationTransmissionCancellationRequest message 35916. As shown in FIG. 369A, the element structure identifies the different packages 36900 that may be in a respective CataloguePublicationTransmissionCancellationRequest message 35916. The element structure for the CataloguePublicationTransmissionCancellationRequest message 35916 includes four levels 36902, 36904, 36906, and 36908 each of which is associated with a respective package 36900. The element structure identifies the occurrence or cardinality 36910 and data type information (i.e., type 36912 and name 36914) for the elements at the respective levels 36902, 36904, 36906, and 36908.

The outermost package of this interface is a CataloguePublicationTransmissionCancellationRequestMessage package 36918, which includes a CataloguePublicationTransmissionCancellationRequestMessage entity 36918 at the first level 36902. The CataloguePublicationTransmissionCancellationRequestMessage entity 36918 is of generic data type ("GDT") 36922 CataloguePublicationTransmissionCancellationRequestMessage 36924.

The CataloguePublicationTransmissionCancellationRequestMessage package 36918 includes a MessageHeader package 36926, a TransmissionInformation package 36928, and a CataloguePublicationTransmission package 36930. The MessageHeader package 36926 includes a MessageHeader entity 36932, which is of type GDT 36936 BusinessDocumentMessageHeader 36938. There is one 36934 MessageHeader entity 36932 for each CataloguePublicationTransmissionCancellationRequestMessage entity 36920.

The MessageHeader entity 36932 includes an ID 36942 and a CreationDateTime 36950. The ID 36942 is of type GDT 36946 BusinessDocumentMessageID 36948. The CreationDateTime 36950 is of type GDT 36954 DateTime 36956. There is one 36944 ID 36942 for each MessageHeader entity 36932 and one 36952 CreationDateTime 36950 for each MessageHeader entity 36932.

The MessageHeader entity 36932 also includes a SenderParty entity 36958. The SenderParty entity 36958 is of type GDT 36962 BusinessDocumentMessageHeaderParty 36964. There is one or zero 36960 SenderParty entity 36958 for each MessageHeader entity 36932.

The TransmissionInformation package 36928 includes a TransmissionHeader entity 36966. The TransmissionHeader entity 36966 is of type GDT 36970 BusinessDocumentTransmissionHeader 36972. There is one or zero 36968 TransmissionHeader entity 36966 for each CataloguePublicationTransmissionCancellationRequestMessage entity 36920. The TransmissionHeader entity 36966 includes a MinimalRequestedLogItemSeverityCode 36976 of type GDT 36980 LogItemSeverityCode 36982. There is one or zero 36978 MinimalRequestedLogItemSeverityCode 36976 for each TransmissionHeader entity 36966.

The CataloguePublicationTransmission package 36930 includes a CataloguePublicationTransmission entity 36984. The CataloguePublicationTransmission entity 36984 is of type GDT 36988 CataloguePublicationTransmissionCancellationRequest 36990. There is one 36986 CataloguePublicationTransmission entity 36984 for each CataloguePublicationTransmissionCancellationRequestMessage entity 36918. The CataloguePublicationTransmission entity 36984 includes an ID 36992. The ID 36992 is of type GDT 36996 TransmissionID 36998. There is one 36994 ID 36992 for each CataloguePublicationTransmission entity 36984.

The CataloguePublicationTransmission package 36930 also includes a Catalogue package 36900A. The Catalogue package 36900A includes a Catalogue entity 36902A. In one implementation, there is one 36904A Catalogue entity 36902A for each CataloguePublicationTransmission entity 36984. The Catalogue entity 36902A includes an ID 36906A. The ID 36906A is of type GDT 36910A CatalogueID 36912A. There is one 36906A ID 36906A for each Catalogue entity 36902A.

Figure 370:
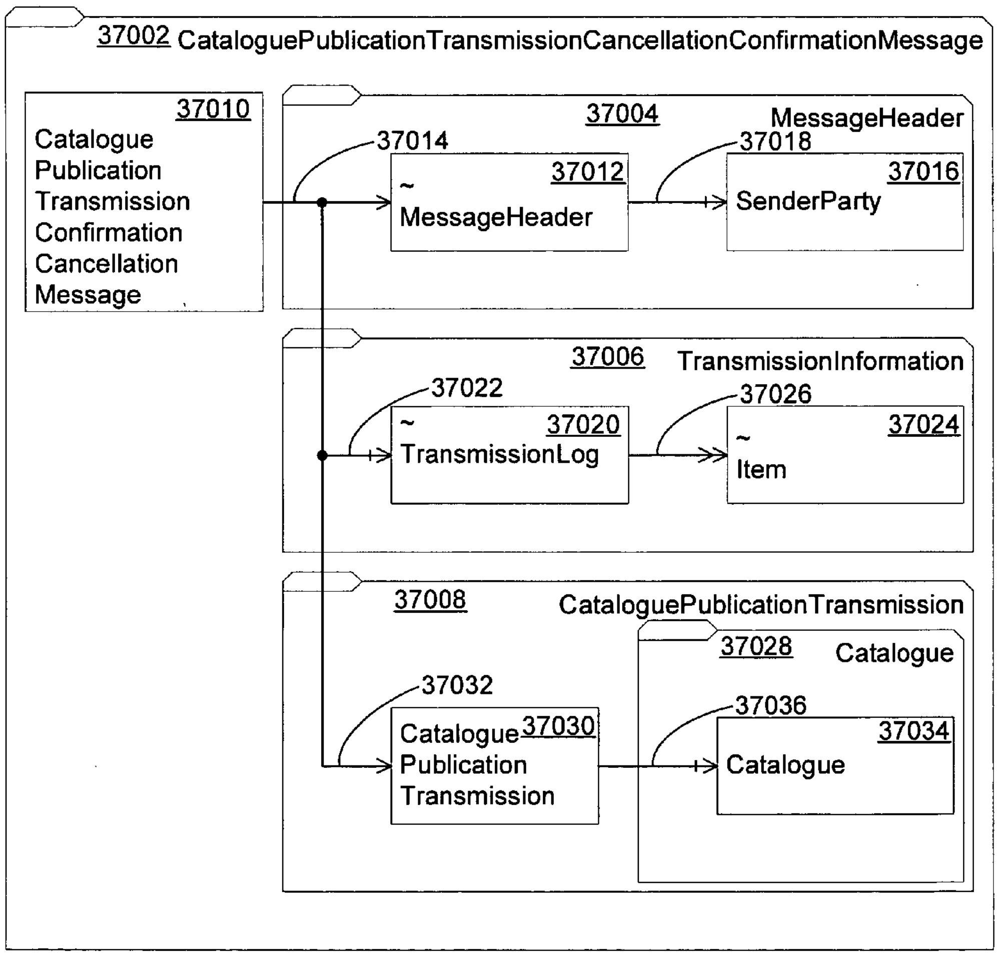
FIG. 370 depicts the data model for the message data type CataloguePublicationTransmissionCancellationConfirmationMessage used to implement a CataloguePublicationTransmissionCancellationConfirmation message.

(10) Message Data Type Catalogue Publication Transmission Cancellation Confirmation Message The data model for the message data type CataloguePublicationTransmissionCancellation ConfirmationMessage used to implement a CataloguePublicationTransmissionCancellationConfirmation message 35918 is depicted in FIG. 370A. The message data type CataloguePublicationTransmissionCancellationConfirmationMessage includes a CataloguePublicationTransmissionCancellationConfirmationMessage package 37002. The CataloguePublicationTransmissionCancellationConfirmationMessage package 37002 includes a MessageHeader package 37004, a TransmissionInformation package 37006, a CataloguePublicationTransmission package 37008, and a CataloguePublicationTransmissionCancellationConfirmationMessage object or entity 37010.

(a) Message Header Package

The MessageHeader package 37004 includes a MessageHeader entity 37012 and a SenderParty entity 37016. There is a 1:1 relationship 37014 between the MessageHeader entity 37012 and the CataloguePublicationTransmissionCancellationConfirmationMessage entity 37010. There is a 1:c relationship 37018 between the MessageHeader entity 37012 and the SenderParty entity 37016. The MessageHeader entity 37012 is of type GDT BusinessDocumentMessageHeader. The SenderParty entity 37016 is of type GDT BusinessDocumentMessageHeaderParty.

(b) Transmission Information Package

The TransmissionInformation package 37006 groups the information pertaining to the transmission of the object or entity (e.g., the CataloguePublicationTransmissionConfirmationCancellationMessage entity 37010) included in the message. The TransmissionInformation package 36406 includes a TransmissionLog entity 37020, which is a collection of events that occurred during processing of the transmitted business document object. The TransmissionLog entity 37020 includes one or more TransmissionLogItem ("Item") entities 37024. Each TransmissionLogItem entity 37024 provides information about an event that occurred during processing of the respective transmitted business document object. Each TransmissionLogItem entity 37024 is of type GDT:LogItem. The MinimumRequestedLogItemSeverityCode stated in a CataloguePublicationTransmissionCancellationRequest message 35916 determines which LogItems are to be returned by specifying their severity. There is a 1:c relationship 37022 between the the CataloguePublicationTransmissionConfirmationCancellation Message entity 37010 and the TransmissionLog entity 37020 and a 1:n relationship 37026 between the TransmissionLog entity 37020 and each TransmissionLogItem entity 37024.

(c) CataloguePublicationTransmission Package

The CataloguePublicationTransmission package 37008 groups the information pertaining to a catalogue publication transmission. The CataloguePublicationTransmission package 37008 includes a Catalogue package 37028 and a CataloguePublicationTransmission entity 37030. There is a 1:1 relationship 37032 between the CataloguePublicationTransmissionCancellationConfirmationMessage entity 37010 and the CataloguePublicationTransmission entity 37030.

(i) CataloguePublicationTransmission Entity

The CataloguePublicationTransmission entity 37030 in a CataloguePublicationTransmissionCancellationConfirmation message 37018 is the confirmation whether the transmission of a catalogue has been cancelled successfully and an earlier published state of this catalogue (if such exists) has been restored or not. The CataloguePublicationTransmission entity 37030 includes an ID of type GDT:TransmissionID that identifies the transmission of the catalogue publication request which was requested to be cancelled. The CataloguePublicationTransmission entity 37030 also includes a CancellationCompletedIndicator of type GDT:BusinessTransactionCompletedIndicator that specifies whether the catalogue publication transmission was cancelled successfully or not. As previously discussed, CataloguePublicationTransmissionCancellationConfirmation message 37018 is sent by the Catalogue Search Engine 3596 to the Catalogue Authoring Tool 3594 in order to signal that the publication has been cancelled successfully or not.

(ii) Catalogue Package

The Catalogue package 37028 groups the information pertaining to the catalogue to be restored. The Catalogue package 37028 includes a Catalogue entity 37034. There is a 1:1 relationship 37036 between the CataloguePublicationTransmission entity 37030 and the Catalogue entity 37034.

(iii) Catalogue

The Catalogue entity 37030 specifies the information about a catalogue in the context of a CataloguePublicationTransmissionCancellationConfirmation message 35918 to confirm cancellation by the Catalogue Search Engine 3596 to the Catalogue Authoring Tool 3594. The Catalogue entity 37030 includes an ID of type GDT:CatalogueID, which identifies the catalogue.

(d) Message Data Type—Element Structure

FIGS. 371A-B depict the element structure for a CataloguePublicationTransmissionCancellationConfirmation message 35918. The element structure is similar to the above described data model of the message data type CataloguePublicationTransmissionCancellationConfirmationMessage as reflected in FIG. 369A, but provides additional information regarding the details for interfacing with or implementing a CataloguePublicationTransmissionCancellationConfirmationMessage data type, such as a CataloguePublicationTransmissionCancellationConfirmation message 35918. As shown in FIG. 371A, the element structure identifies the different packages 37100 that may be in a respective CataloguePublicationTransmissionCancellationConfirmation message 35918. The element structure for the CataloguePublicationTransmissionCancellationConfirmation message 35918 includes four levels 37102, 37104, 37106, and 37108 each of which is associated with a respective package 37100. The element structure identifies the occurrence or cardinality 37110 and data type information (i.e., type 37112 and name 37114) for the elements at the respective levels 37102, 37104, 37106, and 37108.

The outermost package of this interface is a CataloguePublicationTransmissionCancellationConfirmationMessage package 37118, which includes a CataloguePublicationTransmissionCancellationConfirmationMessage entity 37120 at the first level 37102. The CataloguePublicationTransmissionCancellationConfirmationMessage entity 37120 is of generic data type ("GDT") 37122 CataloguePublicationTransmissionCancellationConfirmationMessage 37124.

The CataloguePublicationTransmissionCancellationConfirmationMessage package 37118 includes a MessageHeader package 37126, a TransmissionInformation package 37128, and a CataloguePublicationTransmission package 37130. The MessageHeader package 37126 includes a MessageHeader entity 37132, which is of type GDT 37136 BusinessDocumentMessageHeader 37138. There is one 37134 MessageHeader entity 37132 for each CataloguePublicationTransmissionCancellationConfirmationMessage entity 37120.

The MessageHeader entity 37132 includes an ID 37142 and a CreationDateTime 37150. The ID 37142 is of type GDT 37146 BusinessDocumentMessageID 37148. The CreationDateTime 37150 is of type GDT 37154 DateTime 37156. There is one 37144 ID 37142 for each MessageHeader entity 37132 and one 37152 CreationDateTime 37150 for each MessageHeader entity 37132.

The MessageHeader entity 37132 also includes a SenderParty entity 37158. The SenderParty entity 37158 is of type GDT 37162 BusinessDocumentMessageHeaderParty 37164. There is one or zero 37160 SenderParty entity 37158 for each MessageHeader entity 37132.

The TransmissionInformation package 37128 includes a TransmissionLog entity 37166. There is one or zero 37168 TransmissionLog entity 37166 for each CataloguePublicationTransmissionCancellationConfirmationMessage entity 37120. The TransmissionLog 37166 includes an Item 37170 of type GDT 37174 LogItem 37176. There is one or more 37172 Items 37170 for each TransmissionLog entity 37166.

The CataloguePublicationTransmission package 37130 includes a CataloguePublicationTransmission entity 37178. The CataloguePublicationTransmission entity 37178 is of type GDT 37182 CataloguePublicationTransmissionCancellationConfirmation 37184. There is one 37180 CataloguePublicationTransmission entity 37178 for each CataloguePublicationTransmissionCancellationConfirmationMessage entity 37120. The CataloguePublicationTransmission entity 37178 includes an ID 37186. The ID 37186 is of type GDT 37190 TransmissionID 37192. There is one 37188 ID 37186 for each CataloguePublicationTransmission entity 37178.

The CataloguePublicationTransmission entity 37178 also includes a PackageCompletedIndicator 37194. The PackageCompletedIndicator 37194 is of type GDT 37198 BusinessTransactionCompletedIndicator 37100A. There is one 37196 PackageCompleted Indicator 37194 for each CataloguePublicationTransmission entity 37178.

The CataloguePublicationTransmission package 37130 further includes a Catalogue package 37102A. The Catalogue package 37102A includes a Catalogue entity 37104A. In one implementation, there is one 37106A Catalogue entity 37104A for each CataloguePublicationTransmission entity 37178. The Catalogue entity 37104A includes an ID 37108A. The ID 37108A is of type GDT 37112A CatalogueID 37114A. There is one 37110A ID 37108A for each Catalogue entity 37104A.

Figure 372:
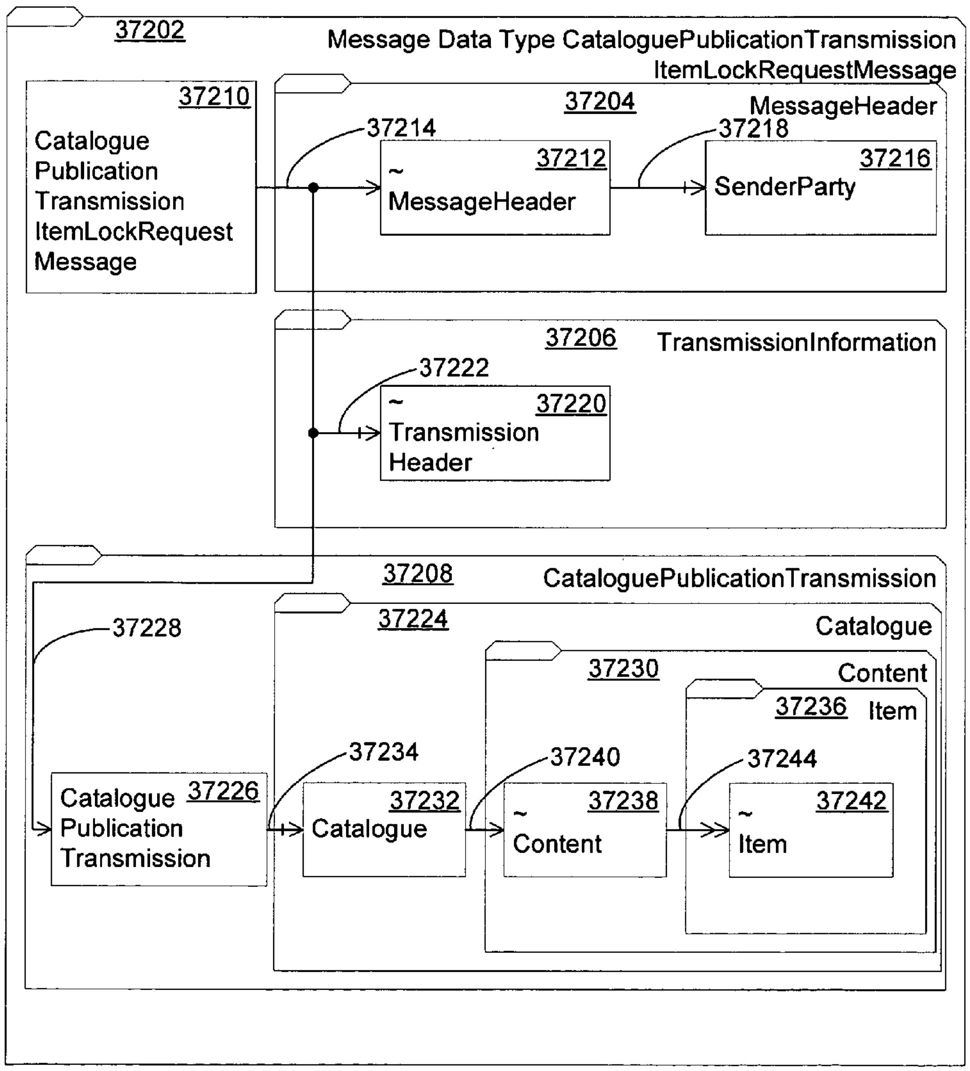
FIG. 372 depicts the data model for the message data type CataloguePublicationTransmissionItemLockRequestMessage used to implement a CataloguePublicationTransmissionItemLockRequest message.

(11) Message Data Type Catalogue Publication Transmission Item Lock Request Message The data model for the message data type CataloguePublicationTransmissionItemLock RequestMessage used to implement a CataloguePublicationTransmissionItemLockRequest message 35920 is depicted in FIG. 372A. The message data type CataloguePublicationTransmissionItemLockRequestMessage includes a CataloguePublicationTransmissionItemLockRequestMessage package 37202. The CataloguePublicationTransmissionItemLockRequestMessage package 37202 includes a MessageHeader package 37204, a TransmissionInformation package 36506, a CataloguePublicationTransmission package 37208, and a CataloguePublicationTransmissionItemLockRequestMessage object or entity 37210.

(a) Message Header Package

The MessageHeader package 37204 includes a MessageHeader entity 37212 and a SenderParty entity 37216. There is a 1:1 relationship 37214 between the MessageHeader entity 37212 and the CataloguePublicationTransmissionItemLockRequestMessage entity 37210. There is a 1:c relationship 37218 between the MessageHeader entity 37212 and the SenderParty entity 37216. The MessageHeader entity 37212 is of type GDT BusinessDocumentMessageHeader. The SenderParty entity 37216 is of type GDT BusinessDocumentMessageHeaderParty.

(b) Transmission Information Package

The TransmissionInformation package 37206 groups the information pertaining to the transmission of the object or entity (e.g., the CataloguePublicationTransmissionItemLockRequestMessage entity 37210) included in the message. The TransmissionInformation package 37206 includes a TransmissionHeader entity 37220. The TransmissionHeader entity 37220 provides information about the identification of the transmission. The TransmissionHeader entity 37220 includes a MinimalRequestedLogItemSeverityCode of type GDT:LogItemSeverityCode. The MininmalRequestedLogItemSeverityCode specifies the severity of log items to returned by the CataloguePublicationTransmissionItemLockConfirmation message 35922. There is a 1:c relationship 37222 between the CataloguePublicationTransmissionItemLockRequestMessage entity 37210 and the TransmissionHeader entity 37220.

(c) CataloguePublicationTransmission package

The CataloguePublicationTransmission package 37208 groups the information pertaining to a catalogue publication transmission. The CataloguePublicationTransmission package 37208 includes a Catalogue package 37224 and a CataloguePublicationTransmission entity 37226. There is a 1:1 relationship 37228 between the CataloguePublicationTransmissionItemLockRequestMessage entity 37210 and the CataloguePublicationTransmission entity 37226.

(i) CataloguePublicationTransmission entity

The CataloguePublicationTransmission entity 37226 in a CataloguePublicationTransmissionItemLockRequest message 37214 is the request to lock single items of the catalogue included in the catalogue publication transmission. To lock means if the catalogue is not yet published the items are not published; if the catalogue is already published, the publication of these items is revoked. The CataloguePublicationTransmission entity 37226 includes an ID of type GDT: TransmissionID that identifies the CataloguePublicationTransmission of which the items are to be locked.

(ii) Catalogue Package

The Catalogue package 37224 groups the information pertaining to the catalogue. The Catalogue package 37224 includes a Content package 37230 and a Catalogue entity 37232. There is a 1:c relationship 37234 between the CataloguePublicationTransmission entity 37226 and the Catalogue entity 37232.

(iii) Catalogue

The Catalogue entity 37232 specifies the information about a catalogue necessary in the context of a CataloguePublicationTransmissionItemLockRequest so that, for example, the Catalogue Search Engine is able to lock the identified catalogue items. The Catalogue entity 37232 includes an ID of type GDT:CatalogueID, which identifies the catalogue from which selected items are to be locked.

(iv) Catalogue Publication Transmission Catalogue Content Package

The CatalogueContent package 37230 includes a CatalogueItem package 37236 and a Content entity 37238, which specifies the list of business objects or entitites which are to be locked. There is a 1:1 relationship 37240 between the Catalogue entity 37232 and the Content entity 37238.

(a) Catalogue Publication Transmission Catalogue Content Catalogue Item Package

The CatalogueItem package 37236 groups the information pertaining to the items to be locked. The CatalogueItem package 37236 includes a CatalogueItem entity 37242, which includes the information about an identified catalogue item to allow the Catalogue Search Engine 3596 to lock the identified catalogue item. The CatalogueItem entity 37242 includes an ID, which identifies the catalogue item to be locked. There is a 1:n relationship 37244 between the Content entity 37238 and the CatalogueItem entity 37242.

(d) Message Data Type—Element Structure

FIGS. 373A-C depict the element structure for a CataloguePublicationTransmissionItemLockRequest message 35920. The element structure is similar to the above described data model of the message data type CataloguePublicationTransmissionItemLockRequestMessage as reflected in FIG. 372A, but provides additional information regarding the details for interfacing with or implementing a CataloguePublicationTransmissionItemLockRequestMessage data type, such as a CataloguePublicationTransmissionItemLockRequest message 35920. As shown in FIG. 373A, the element structure identifies the different packages 37300 that may be in a respective CataloguePublicationTransmissionItemLockRequest message 35920. The element structure for the CataloguePublicationTransmissionItemLockRequest message 35920 includes six levels 37302, 37304, 37306, 37308, 37310, and 37312 each of which is associated with a respective package 37300. The element structure identifies the occurrence or cardinality 37314 and data type information (i.e., type 37316 and name 37318) for the elements at the respective levels 37302, 37304, 37306, 37308, 37310, and 37312.

The outermost package of this interface is a CataloguePublicationTransmissionItemLockRequestMessage package 37320, which includes a CataloguePublicationTransmissionItemLockRequestMessage entity 37322 at the first level 37302. The CataloguePublicationTransmissionItemLockRequestMessage entity 37322 is of generic data type ("GDT") 37323 CataloguePublicationTransmissionItemLockRequestMessage 37324.

The CataloguePublicationTransmissionItemLockRequestMessage package 37320 includes a MessageHeader package 37326, a TransmissionInformation package 37328, and a CataloguePublicationTransmission package 37330. The MessageHeader package 37326 includes a MessageHeader entity 37332, which is of type GDT 37336 BusinessDocumentMessageHeader 37338. There is one 37334 MessageHeader entity 37332 for each CataloguePublicationTransmissionItemLockRequestMessage entity 37322.

The MessageHeader entity 37332 includes an ID 37340 and a CreationDateTime 37348. The ID 37340 is of type GDT 37344 BusinessDocumentMessageID 37346. The CreationDateTime 37348 is of type GDT 37352 DateTime 37354. There is one 37342 ID 37340 for each MessageHeader entity 37332 and one 37350 CreationDateTime 37348 for each MessageHeader entity 37332.

The MessageHeader entity 37332 also includes a SenderParty entity 37356. The SenderParty entity 37356 is of type GDT 37360 BusinessDocumentMessageHeaderParty 37362. There is one or zero 37358 SenderParty entity 37356 for each MessageHeader entity 37332.

The TransmissionInformation package 37328 includes a TransmissionHeader entity 37364. The TransmissionHeader entity 37364 is of type GDT 37368 BusinessDocumentTransmissionHeader 37370. There is one or zero 37366 TransmissionHeader entity 37364 for each CataloguePublicationTransmissionItemLockRequestMessage entity 37322. The TransmissionHeader entity 37364 includes a MinimalRequestedLogItemSeverityCode 37372 of type GDT 37376 LogItemSeverityCode 37378. There is one or zero 37374 MinimalRequestedLogItemSeverityCode 37372 for each TransmissionHeader entity 37364.

The CataloguePublicationTransmission package 37330 includes a CataloguePublicationTransmission entity 37380. The CataloguePublicationTransmission entity 37380 is of type GDT 37384 CataloguePublicationTransmissionItemLockRequest 37386. There is one 37382 CataloguePublicationTransmission entity 37380 for each CataloguePublicationTransmissionItemLockRequestMessage entity 37322. The CataloguePublicationTransmission entity 37380 includes an ID 37388. The ID 37388 is of type GDT 37392 TransmissionID 37394. There is one 37390 ID 37388 for each CataloguePublicationTransmission entity 37380.

The CataloguePublicationTransmission package 37330 also includes a Catalogue package 37396. The Catalogue package 37396 includes a Catalogue entity 37398. In one implementation, there is one 37300A Catalogue entity 37398 for each CataloguePublicationTransmission entity 37380. The Catalogue entity 37398 includes an ID 37302A. The ID

37302A is of type GDT 37306A CatalogueID 37308A. There is one 37304A ID 37302A for each Catalogue entity 37398.

The Catalogue package 37396 also includes a Content package 37310A. The Content package 37310A includes a Content entity 37312A and an Item package 37316A. In one implementation, there is one 37314A Content entity 37312A for each Catalogue entity 37398.

The Item package 37316A includes an Item entity 37318A. There is one or more 37320A Item entities 37318A for each Content entity 37312A. Each Item entity 37318A includes an ID 37322A. The ID 37322A is of type GDT 37326A CatalogueItemID 37328A. There is one 37324A ID 37322A for each Item entity 37316A.

Figure 374:
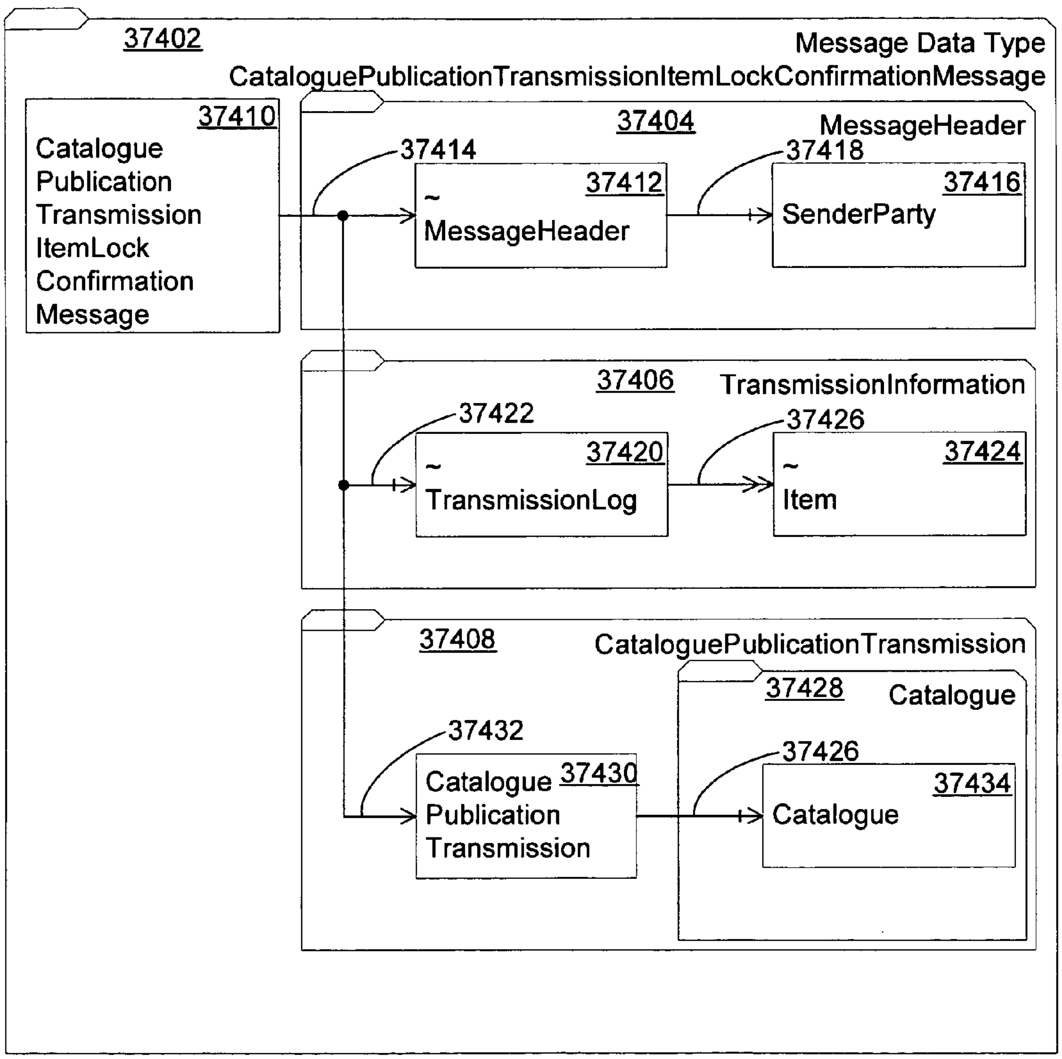
FIG. 374 depicts the data model for the message data type CataloguePublicationTransmissionCancellationConfirmationMessage used to implement a CataloguePublicationTransmissionItemLockConfirmation message.

(12) Message Data Type Catalogue Publication Transmission Item Lock Confirmation Message The data model for the message data type CataloguePublicationTransmissionCancellation ConfirmationMessage used to implement a CataloguePublicationTransmissionItemLockConfirmation message 35922 is depicted in FIG. 374A. The message data type CataloguePublicationTransmissionItemLockConfirmationMessage includes a CataloguePublicationTransmissionItemLockConfirmationMessage package 37402. The CataloguePublicationTransmissionItemLockConfirmationMessage package 37402 includes a MessageHeader package 37404, a TransmissionInformation package 37406, a CataloguePublicationTransmission package 37408, and a CataloguePublicationTransmissionItemLockConfirmationMessage object or entity 37410.

(a) Message Header Package

The MessageHeader package 37404 includes a MessageHeader entity 37412 and a SenderParty entity 37416. There is a 1:1 relationship 37414 between the MessageHeader entity 37412 and the CataloguePublicationTransmissionItemLockConfirmationMessage entity 37410. There is a 1:c relationship 37418 between the MessageHeader entity 37412 and the SenderParty entity 37416. The MessageHeader entity 37412 is of type GDT. BusinessDocumentMessageHeader. The SenderParty entity 37416 is of type GDT BusinessDocumentMessageHeaderParty.

(b) Transmission Information Package

The TransmissionInformation package 37406 groups the information pertaining to the transmission of the object or entity (e.g., the CataloguePublicationTransmissionConfirmationCancellationMessage entity 37410) included in the message. The TransmissionInformation package 36406 includes a TransmissionLog entity 37420, which is a collection of events that occurred during processing of the transmitted business document object. The TransmissionLog entity 37420 includes one or more TransmissionLogItem ("Item") entities 37424. Each TransmissionLogItem entity 37424 provides information about an event that occurred during processing of the respective transmitted business document object. Each TransmissionLogItem entity 37424 is of type GDT:LogItem. The MinimumRequestedLogItemSeverityCode provided in a CataloguePublicationTransmissionItemLockRequest message 35920 determines which TransmissionLogItems are to be returned by specifying their severity. There is a 1:c relationship 37422 between the the CataloguePublicationTransmissionConfirmationCancellation Message entity 37410 and the TransmissionLog entity 37420 and a 1:n relationship 37426 between the TransmissionLog entity 37420 and each TransmissionLogItem entity 37424.

(c) CataloguePublicationTransmission Package

The CataloguePublicationTransmission package 37408 groups the information pertaining to a catalogue publication transmission. The CataloguePublicationTransmission package 37408 includes a Catalogue package 37428 and a CataloguePublicationTransmission entity 37430. There is a 1:1 relationship 37432 between the CataloguePublicationTransmissionItemLockConfirmationMessage entity 37410 and the CataloguePublicationTransmission entity 37430.

(i) CataloguePublicationTransmission Entity

The CataloguePublicationTransmission entity 37430 in a CataloguePublicationTransmissionItemLockConfirmation message 37422 is the confirmation whether identified items of the catalogue included in the catalogue publication transmission could be locked or not. To lock means: if the catalogue is not yet published the items are not published; if the catalogue is already published, the publication of these items is revoked. The CataloguePublicationTransmission entity 37430 includes an ID of type GDT:TransmissionID that identifies the Catalogue publication transmission or the original catalogue publication request of which items where requested to be locked. The CataloguePublicationTransmission entity 37430 also includes a ItemLockCompletedIndicator of type GDT:BusinessTransactionCompletedIndicator that specifies whether the identified items were locked or not.

(ii) Catalogue Package

The Catalogue package 37428 groups the information pertaining to the catalogue. The Catalogue package 37428 includes a Catalogue entity 37434. There is a 1:c relationship 37436 between the CataloguePublicationTransmission entity 37430 and the Catalogue entity 37434.

(iii) Catalogue

The Catalogue entity 37434 specifies the information about a catalogue in the context of a CataloguePublicationTransmissionItemLockConfirmation message 35922 to confirm to the Catalogue Authoring Tool 3594 that an identified item is locked by the Catalogue Search Engine 3596. The Catalogue entity 37430 includes an ID of type GDT:CatalogueID, which identifies the catalogue from which the identified items are to be locked.

(d) Message Data Type—Element Structure

FIGS. 375A-B depict the element structure for a CataloguePublicationTransmissionItemLockConfirmation message 35922. The element structure is similar to the above described data model of the message data type CataloguePublicationTransmissionItemLockConfirmationMessage as reflected in FIG. 374A, but provides additional information regarding the details for interfacing with or implementing a CataloguePublicationTransmissionItemLockConfirmationMessage data type, such as a CataloguePublicationTransmissionItemLockConfirmation message 35922. As shown in FIG. 375A, the element structure identifies the different packages 37500 that may be in a respective CataloguePublicationTransmissionItemLockConfirmation message 35922. The element structure for the CataloguePublicationTransmissionItemLockConfirmation message 35922 includes four levels 37502, 37504, 37506, and 37508 each of which is associated with a respective package 37500. The element structure identifies the occurrence or cardinality 37510 and data type information (i.e., type 37512 and name 37514) for the elements at the respective levels 37502, 37504, 37506, and 37508.

The outermost package of this interface is a CataloguePublicationTransmissionItemLockConfirmationMessage package 37518, which includes a CataloguePublicationTransmissionItemLockConfirmationMessage entity 37520 at the first level 37502. The CataloguePublicationTransmissionItemLockConfirmationMessage entity 37520 is of generic data type ("GDT") 37522 CataloguePublicationTransmissionItemLockConfirmationMessage 37524.

The CataloguePublicationTransmissionItemLockConfirmationMessage package 37518 includes a MessageHeader package 37526, a TransmissionInformation package 37528, and a CataloguePublicationTransmission package 37530. The MessageHeader package 37526 includes a MessageHeader entity 37532, which is of type GDT 37536 BusinessDocumentMessageHeader 37538. There is one 37534 MessageHeader entity 37532 for each CataloguePublicationTransmissionItemLockConfirmationMessage entity 37520.

The MessageHeader entity 37532 includes an ID 37542 and a CreationDateTime 37550. The ID 37542 is of type GDT 37546 BusinessDocumentMessageID 37548. The CreationDateTime 37550 is of type GDT 37554 DateTime 37556. There is one 37544 ID 37542 for each MessageHeader entity 37532 and one 37552 CreationDateTime 37550 for each MessageHeader entity 37532.

The MessageHeader entity 37532 also includes a SenderParty entity 37558. The SenderParty entity 37558 is of type GDT 37562 BusinessDocumentMessageHeaderParty 37564. There is one or zero 37560 SenderParty entity 37558 for each MessageHeader entity 37532.

The TransmissionInformation package 37528 includes a TransmissionLog entity 37566. There is one or zero 37568 TransmissionLog entity 37566 for each CataloguePublicationTransmissionItemLockConfirmationMessage entity 37520. The TransmissionLog 37566 includes an Item 37570 of type GDT 37574 LogItem 37576. There is one or more 37572 Items 37570 for each TransmissionLog entity 37566.

The CataloguePublicationTransmission package 37530 includes a CataloguePublicationTransmission entity 37578. The CataloguePublicationTransmission entity 37578 is of type GDT 37582 CataloguePublicationTransmissionItemLockConfirmation 37584. There is one 37580 CataloguePublicationTransmission entity 37578 for each CataloguePublicationTransmissionItemLockConfirmationMessage entity 37520. The CataloguePublicationTransmission entity 37578 includes an ID 37586. The ID 37586 is of type GDT 37590 TransmissionID 37592. There is one 37588 ID 37586 for each CataloguePublicationTransmission entity 37578.

The CataloguePublicationTransmission entity 37578 also includes an ItemLockCompletedIndicator 37594. The ItemLockCompletedIndicator 37594 is of type GDT 37598 BusinessTransactionCompletedIndicator 37500A. There is one 37596 ItemLockCompleted Indicator 37594 for each CataloguePublicationTransmission entity 37578.

The CataloguePublicationTransmission package 37530 further includes a Catalogue package 37502A. The Catalogue package 37502A includes a Catalogue entity 37504A. In one implementation, there is one 37506A Catalogue entity 37504A for each CataloguePublicationTransmission entity 37578. The Catalogue entity 37504A includes an ID 37508A. The ID 37508A is of type GDT 37512A CatalogueID 37514A. There is one 37510A ID 37508A for each Catalogue entity 37504A.

g) Purchase Order Information

The A2A PurchaseOrderInformation interface is the interface that is used to inform interested applications about creating, changing, confirming, and deleting a purchase order.

Numerous complex processes exist that run in distributed system landscapes and that are dependent on information about purchase orders. Examples of these are planning processes that have to be informed of the amount of MRP-relevant products ordered and logistics processes that have to be informed of expected goods receipts in good time. The standard system already provides for many of these processes, which are covered by specialized messages. However, there will always be customer-specific processes that are implemented at the project level. The PurchaseOrderInformation interface serves as the generic interface for implementing such customer-specific processes that are dependent on purchase order information. More than just a simple interface structure, the PurchaseOrderInformation interface defines the underlying corporate significance and, at the same time, dispenses with the need to exchange proprietary information. In this way, external applications that implement the PurchaseOrderInformation interface can be integrated without much outlay.

(1) Message Type Purchase Order Information

PurchaseOrderInformation is the information from a procurement system for interested recipients about the status of a purchase order (PurchaseOrder). This includes purchase order changes, order confirmations, and order cancellations. The structure of the PurchaseOrderInformation message is the structure of the PurchaseOrderInformationMessage.

(2) Message Choreography

Figure 376:
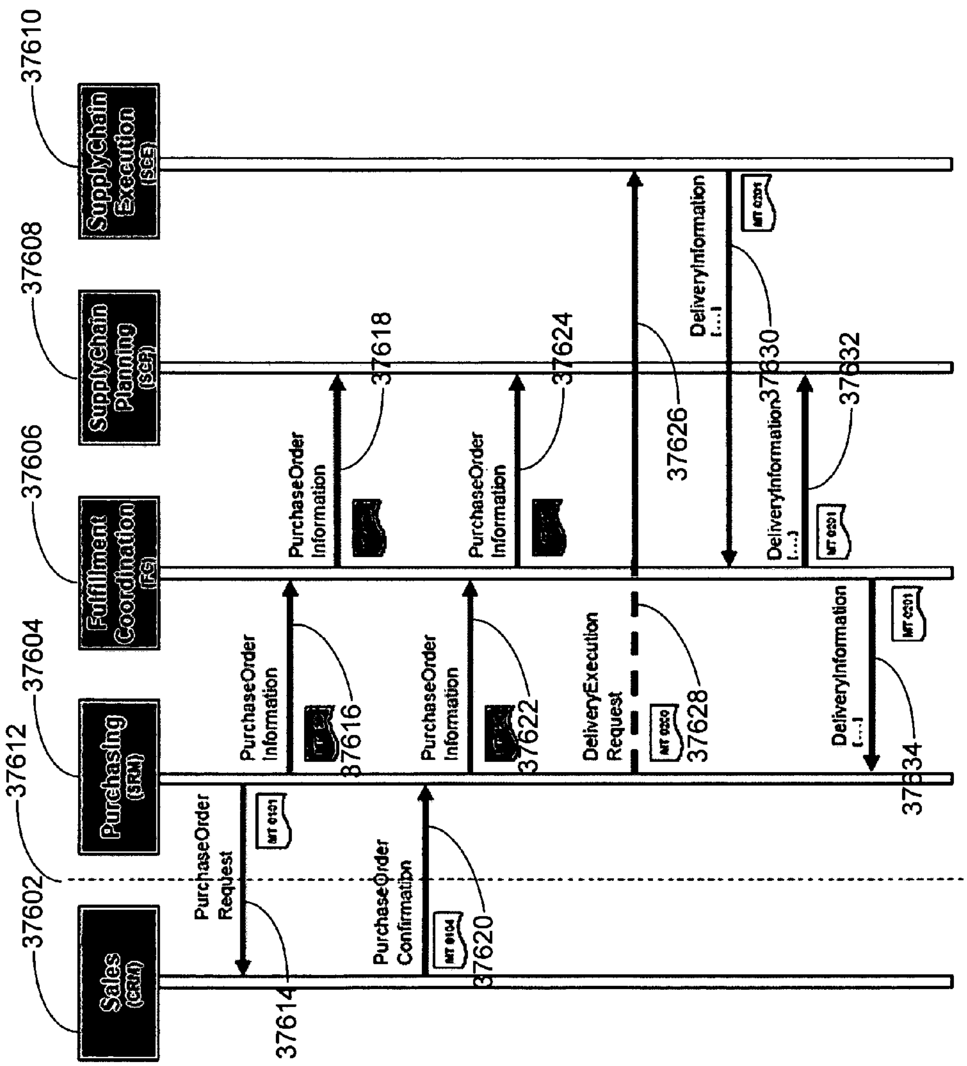
FIG. 376 depicts an example message choreography for the A2A PurchaseOrderInformation interface established between several different example applications.
Figure 377A:
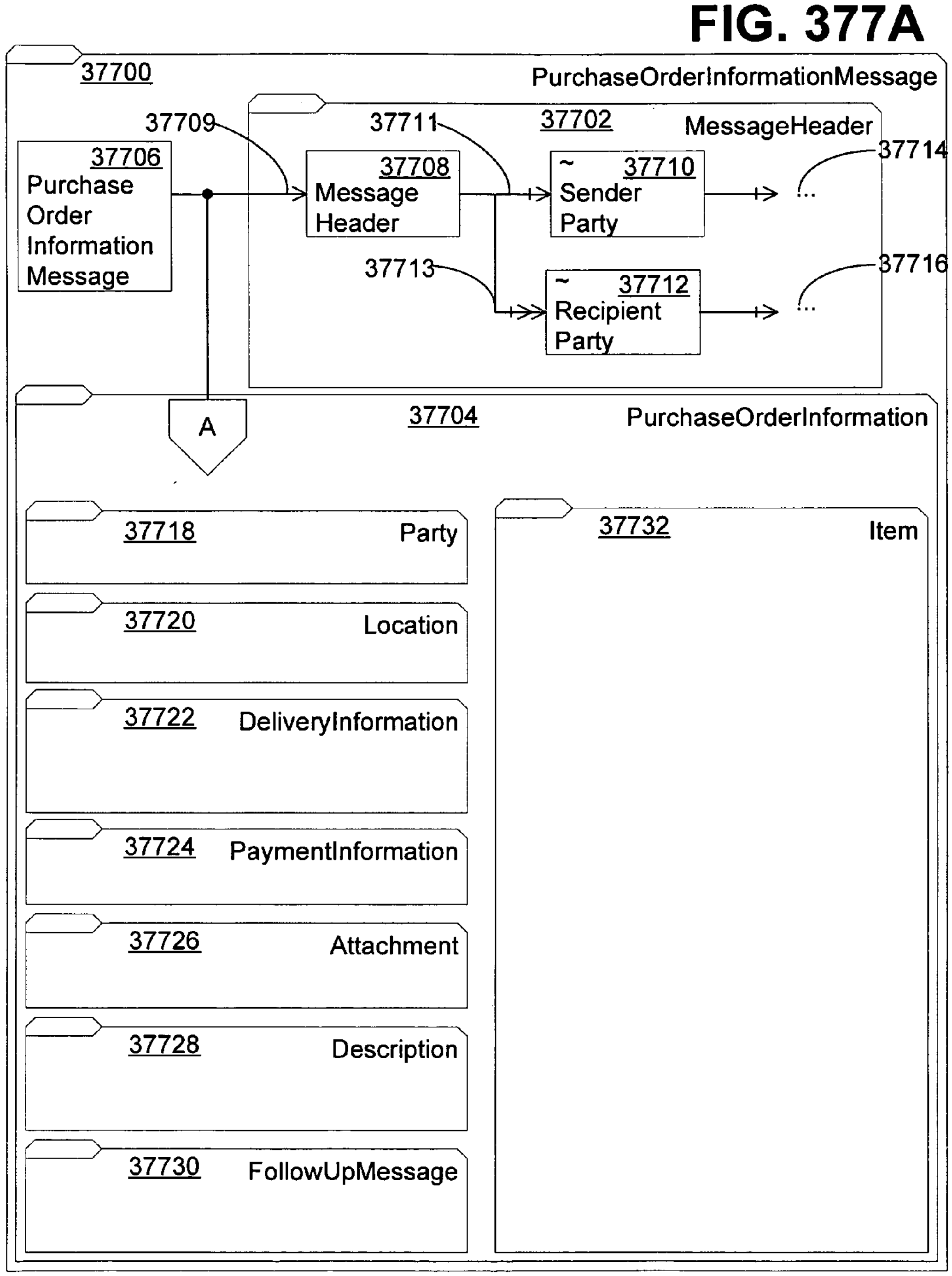
FIG. 377A-M depicts the data model for the PurchaseOrderInformationMessage.
Figure 377B:
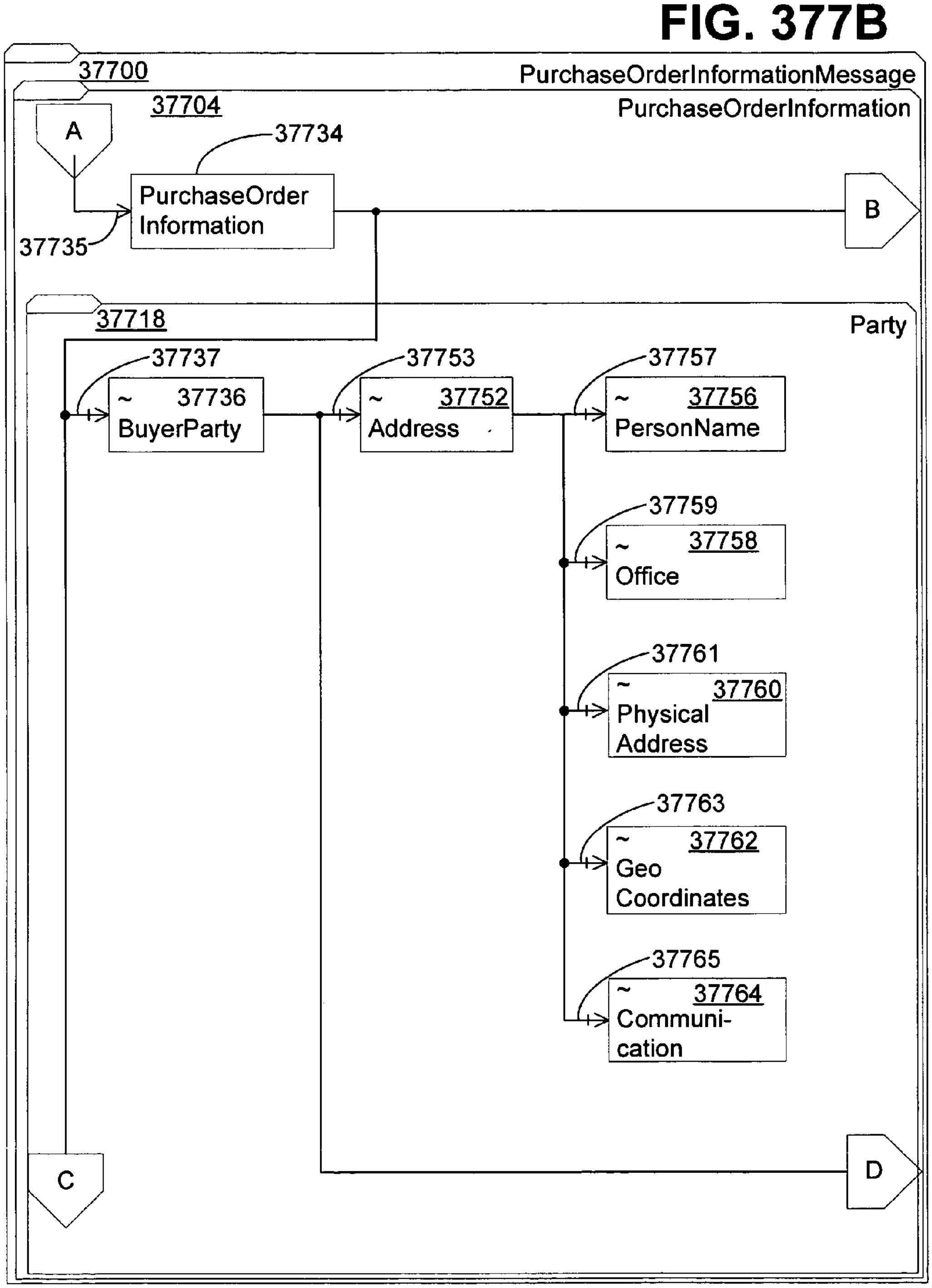
Figure 377C:
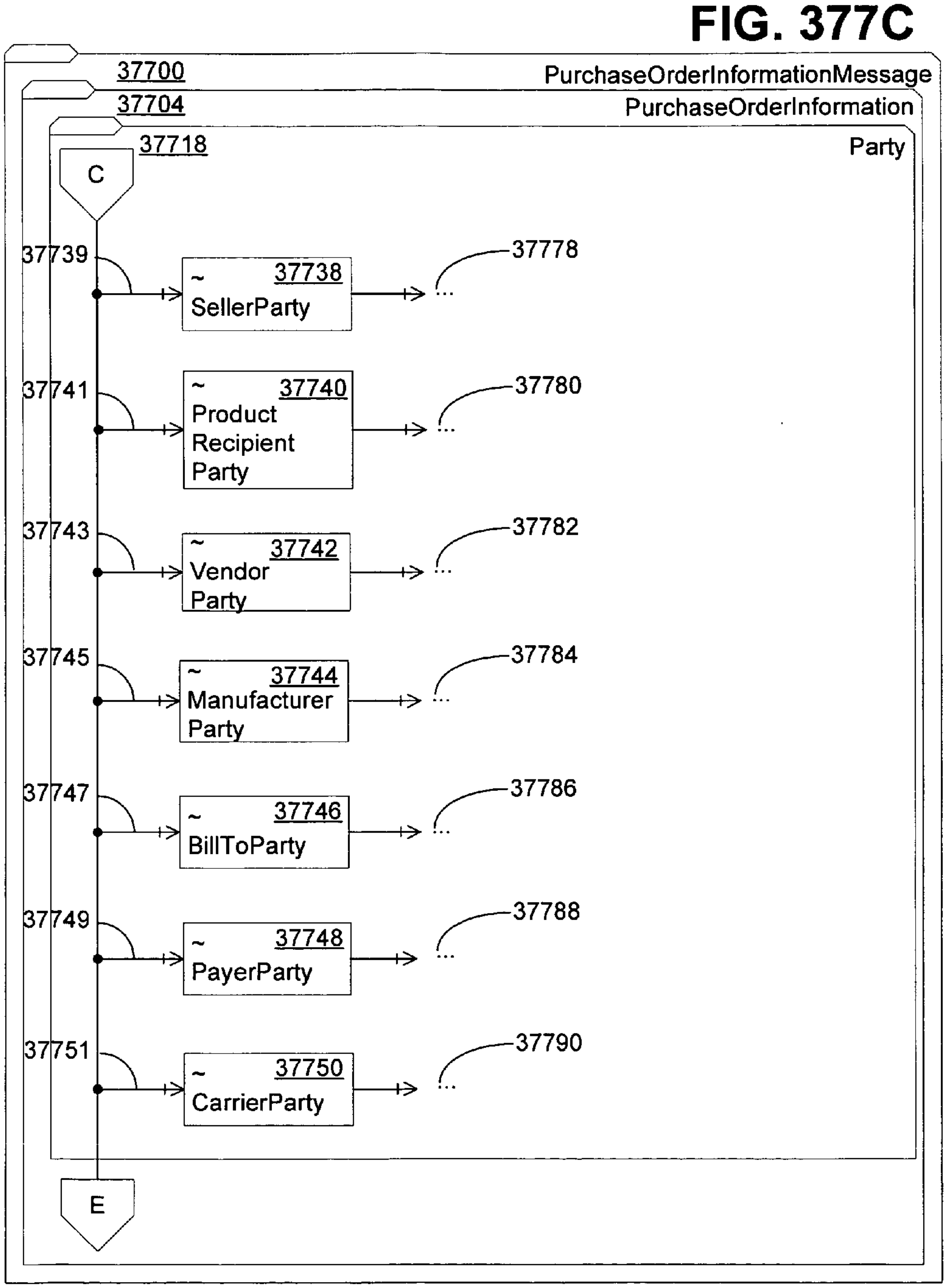
Figure 377D:
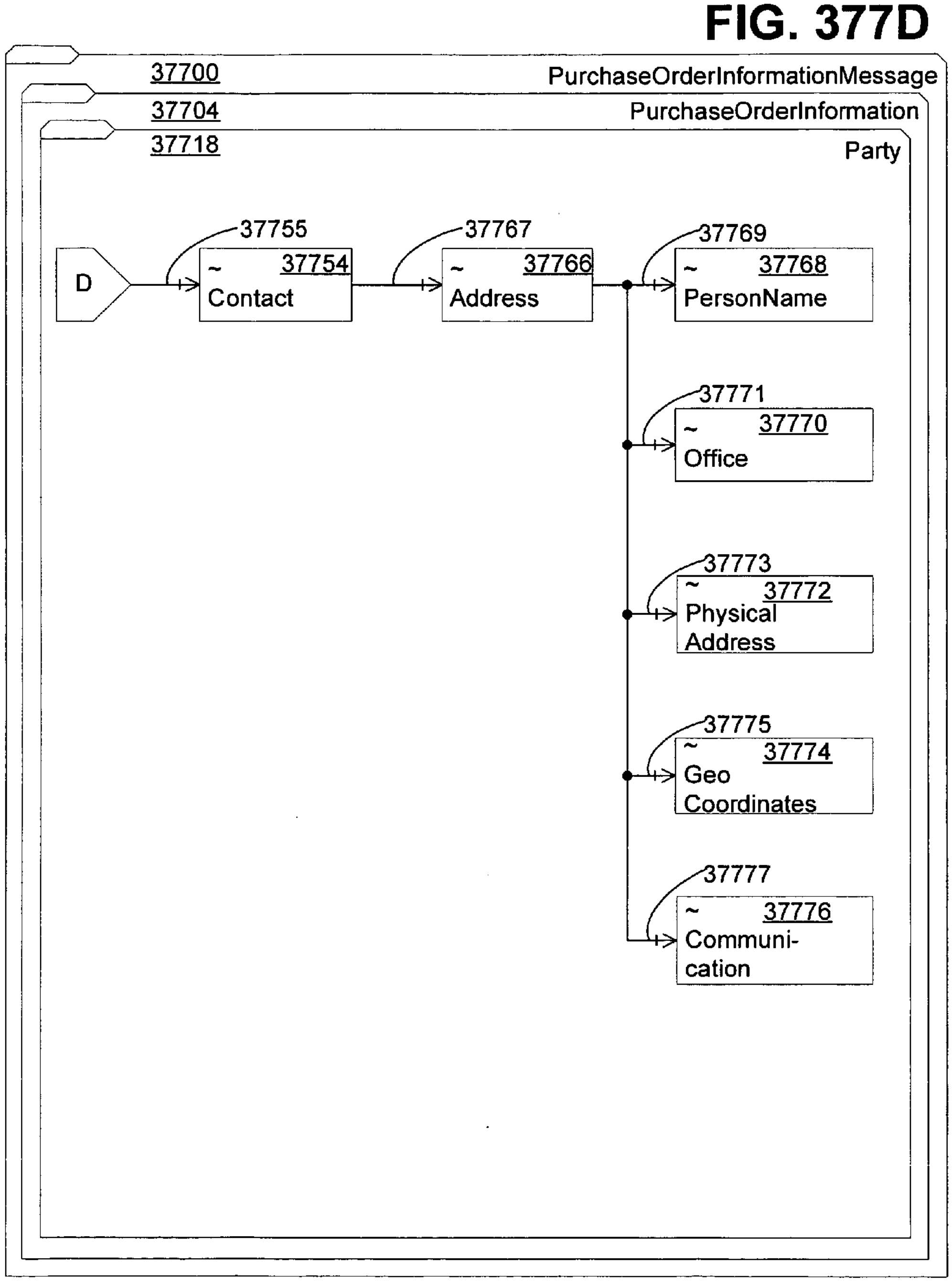
Figure 377E:
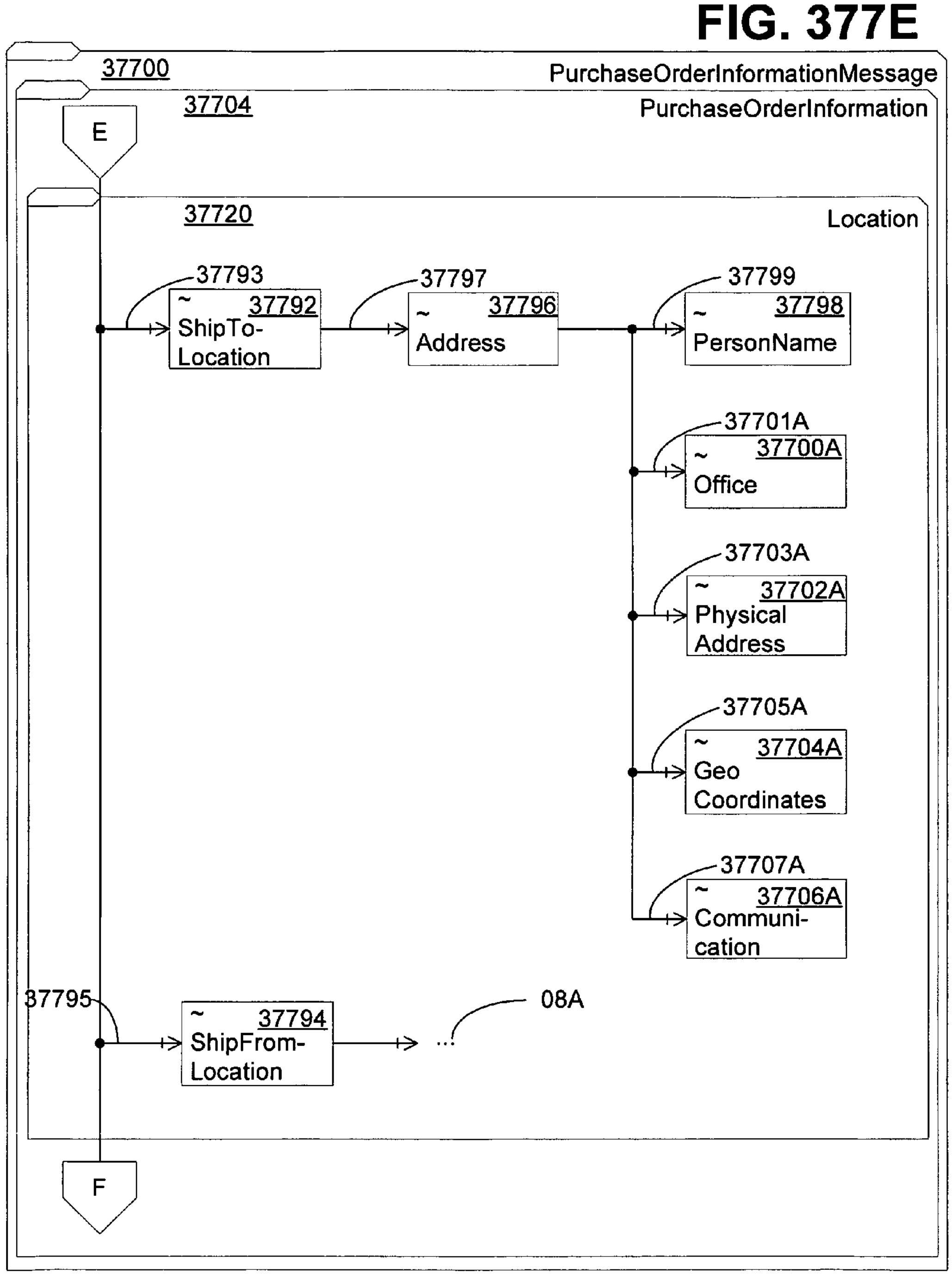
Figure 377F:
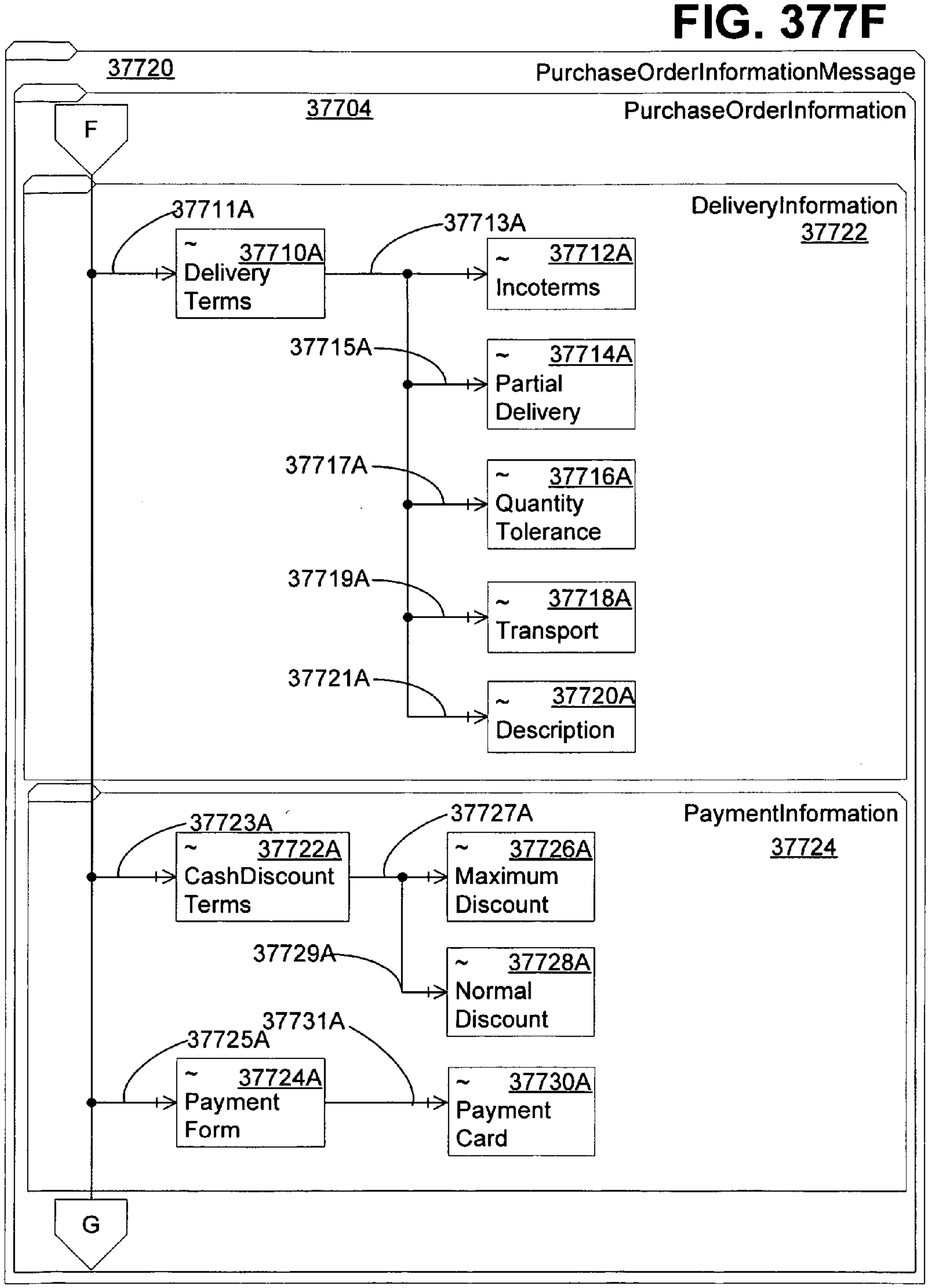
Figure 377G:
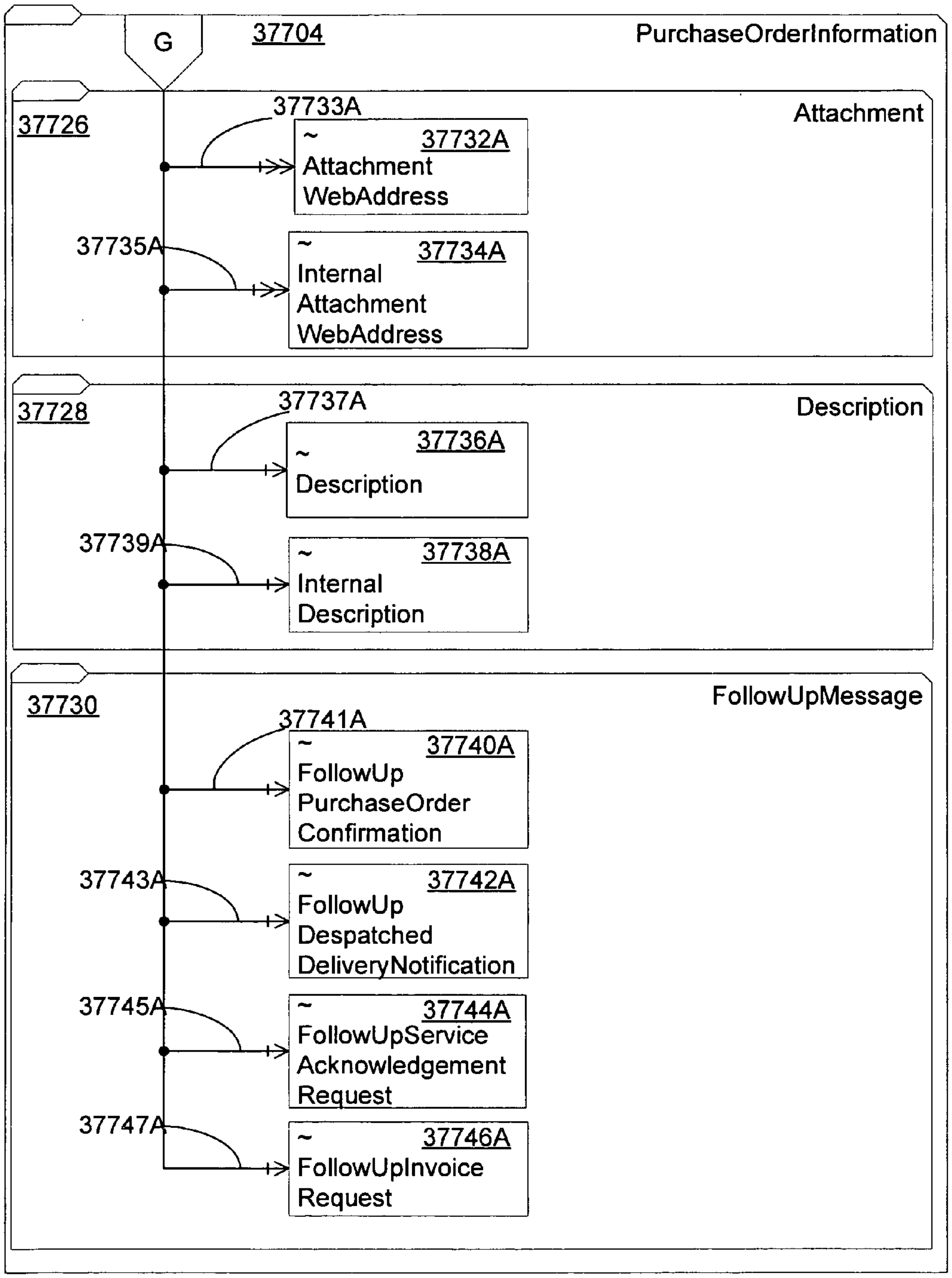
Figure 377H:
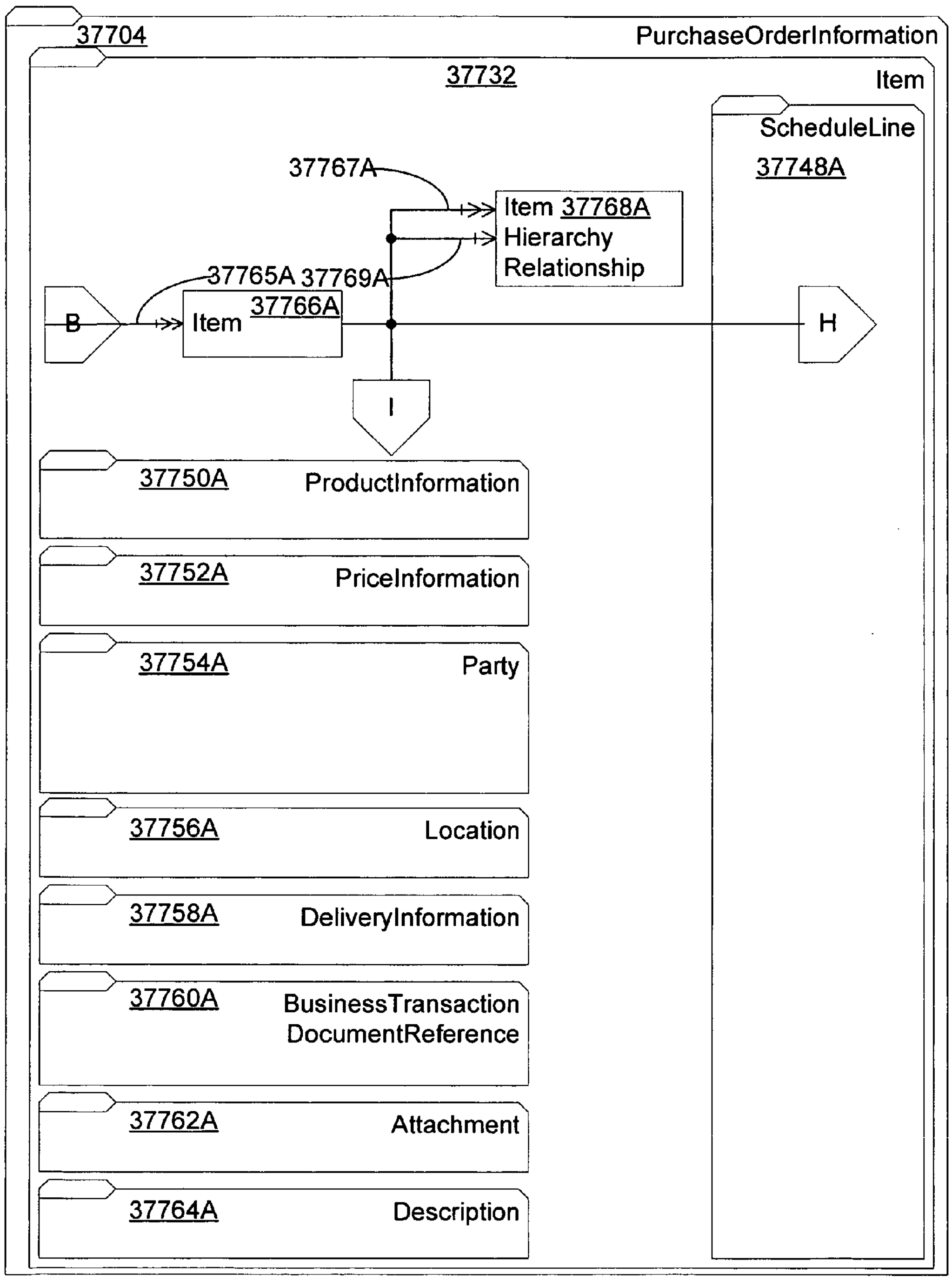
Figure 377I:
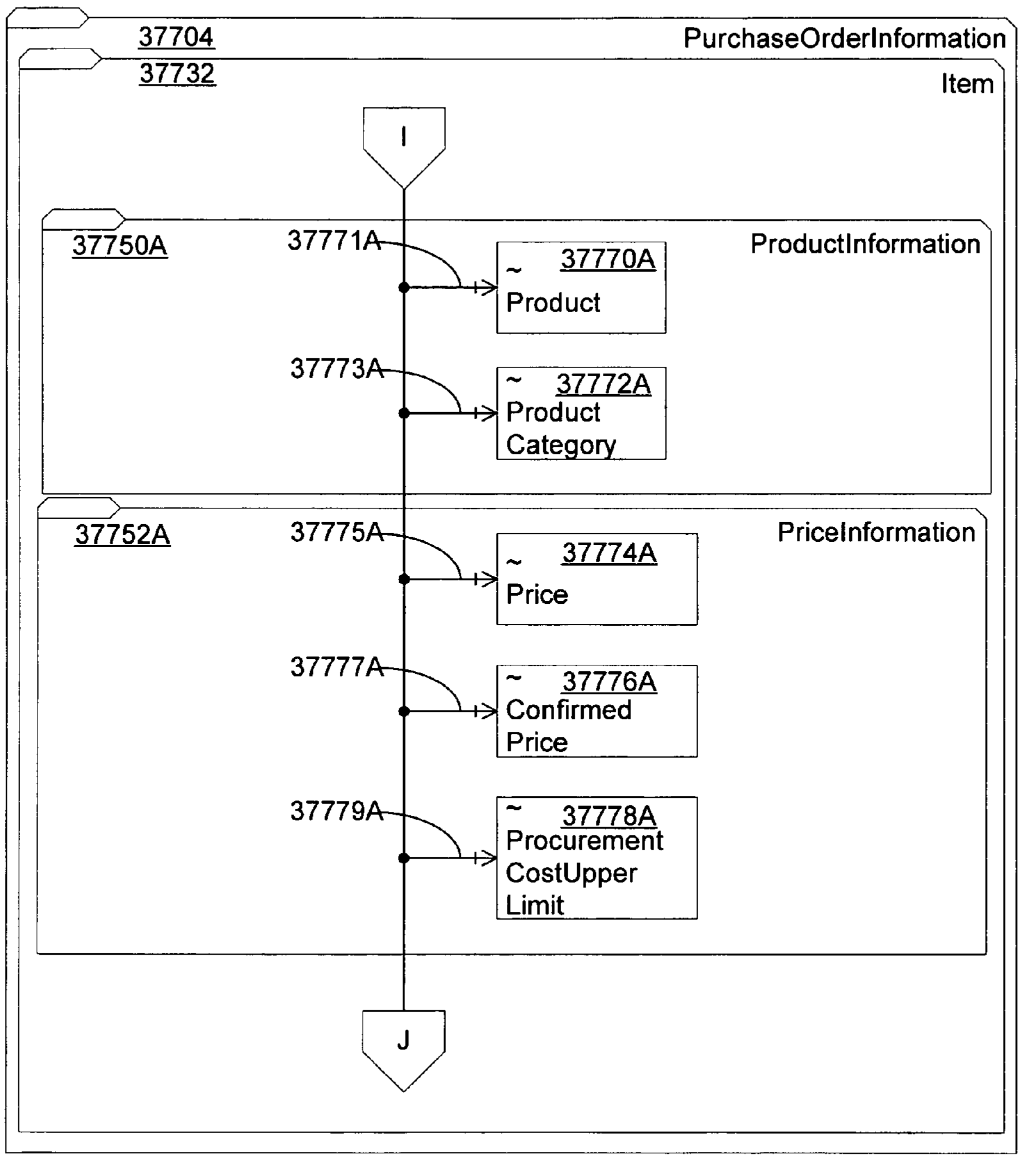
Figure 377J:
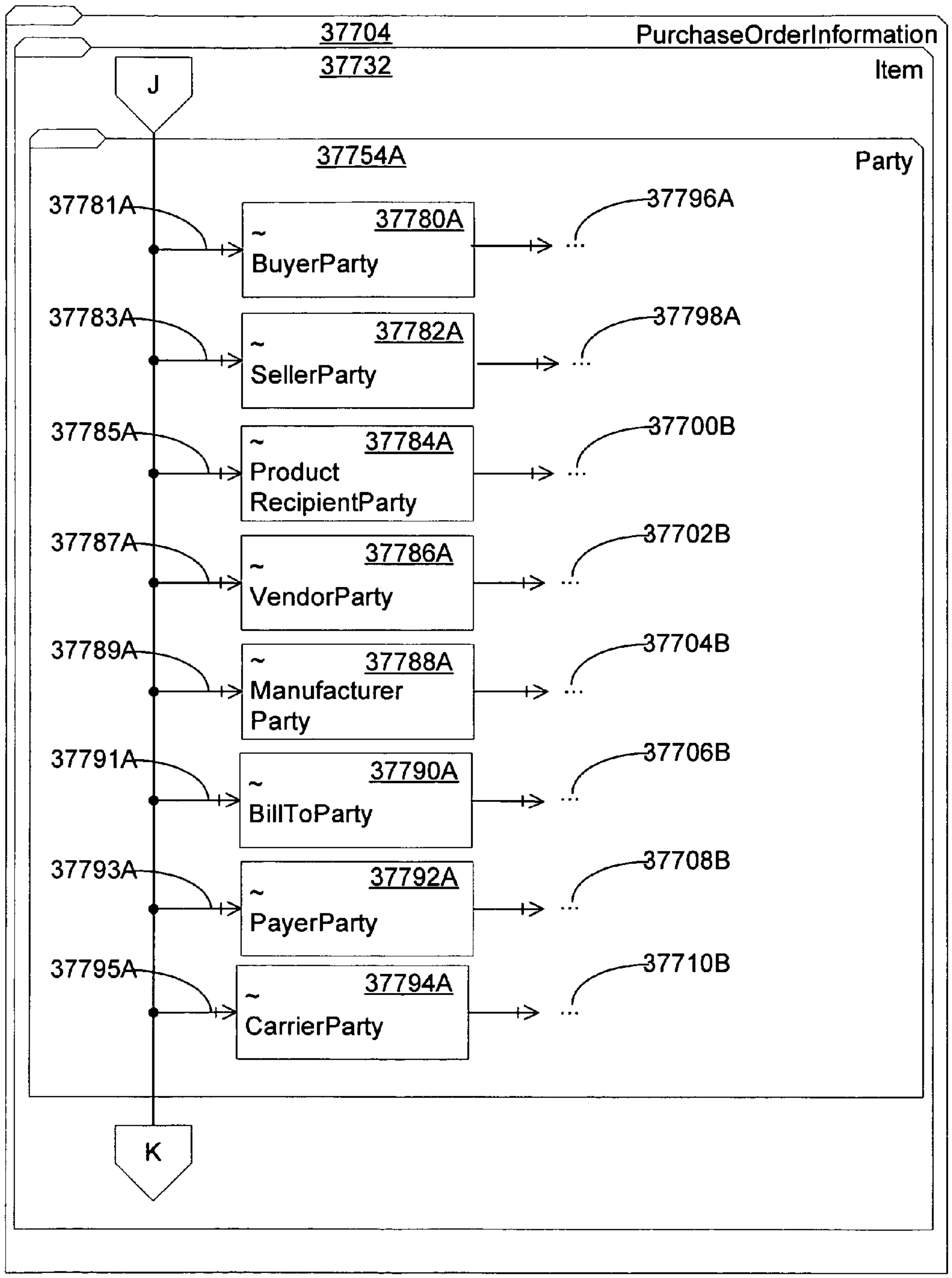
Figures 1, 377K:
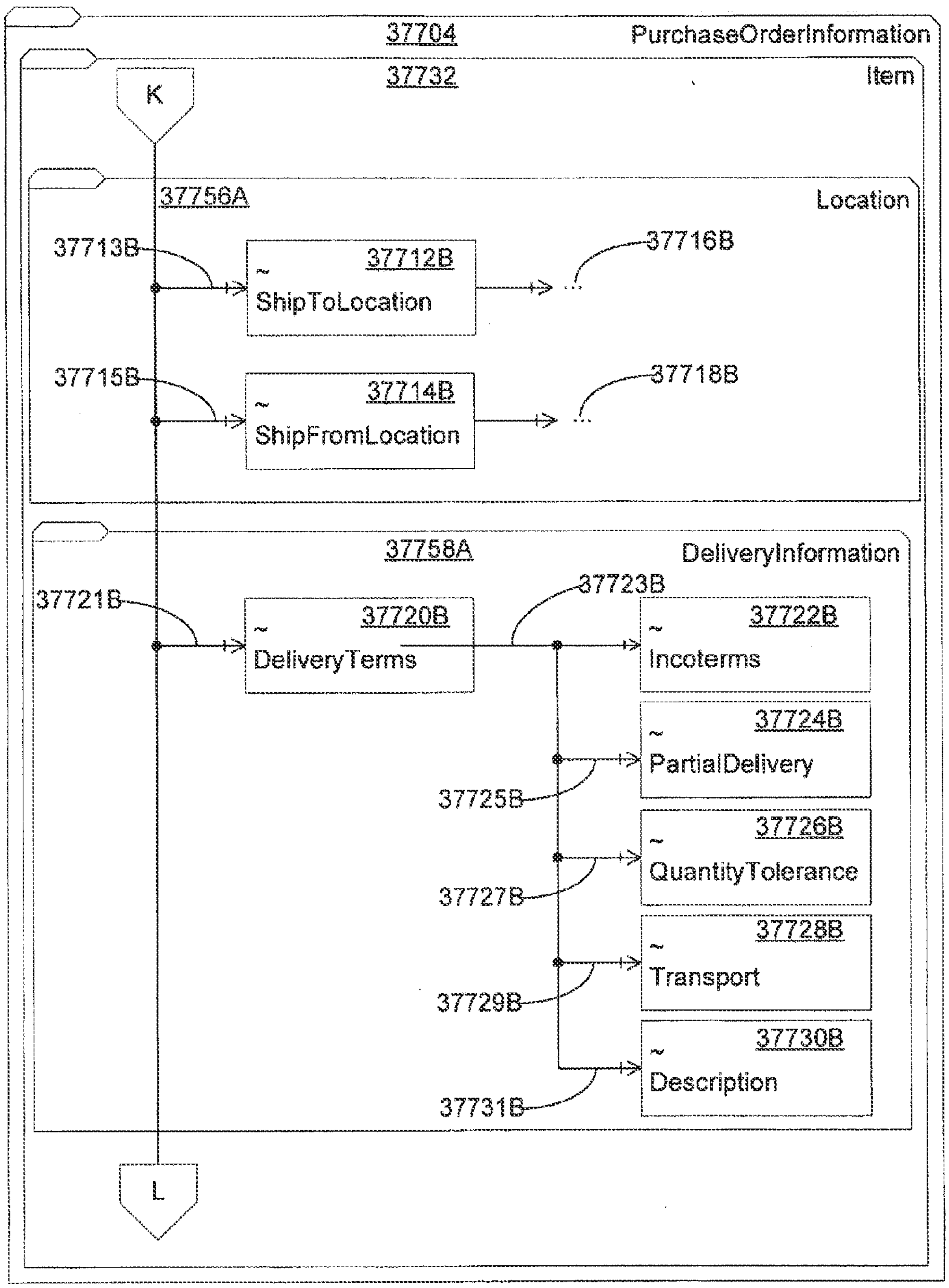
Figures 2, 377K:
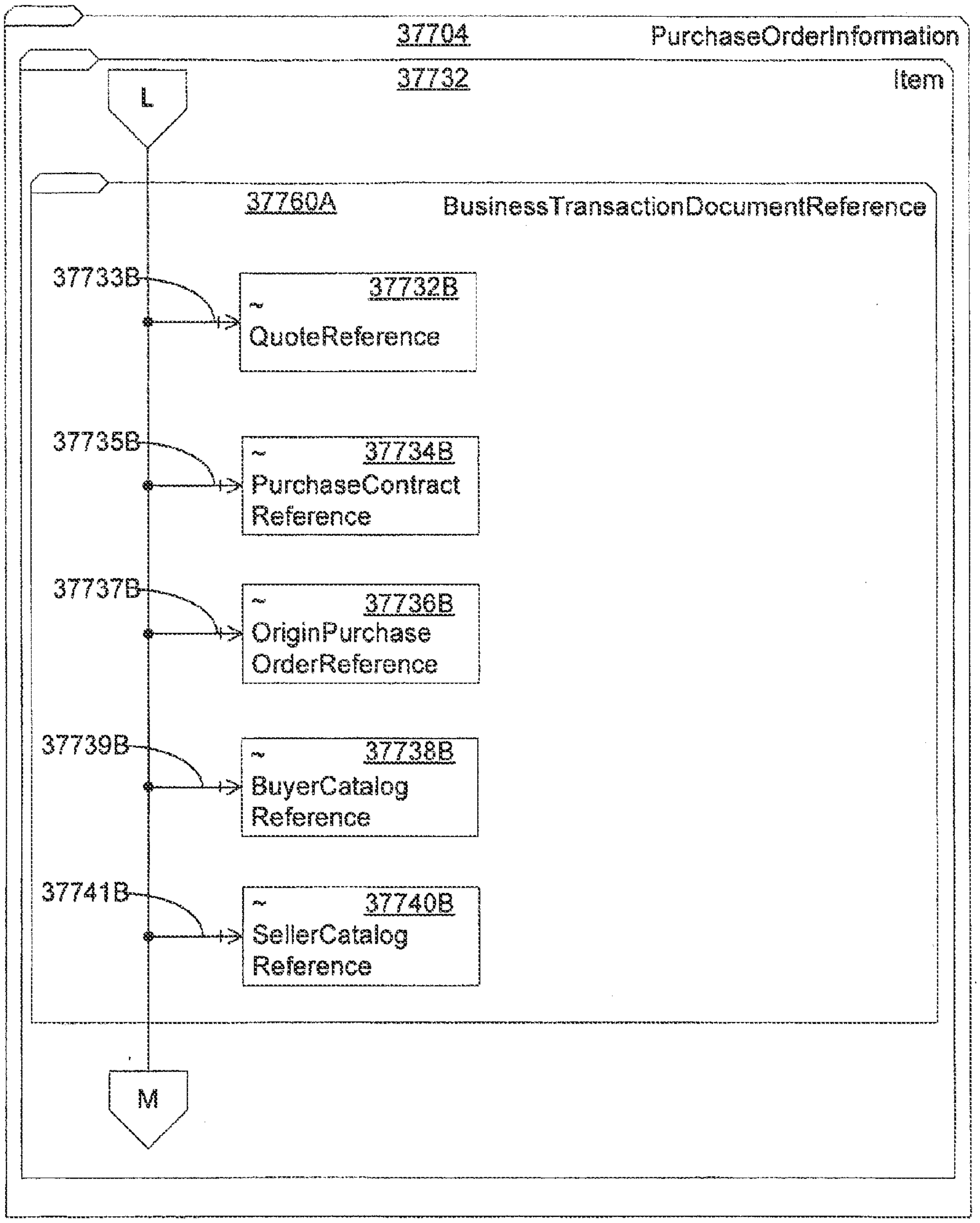
Figure 377L:
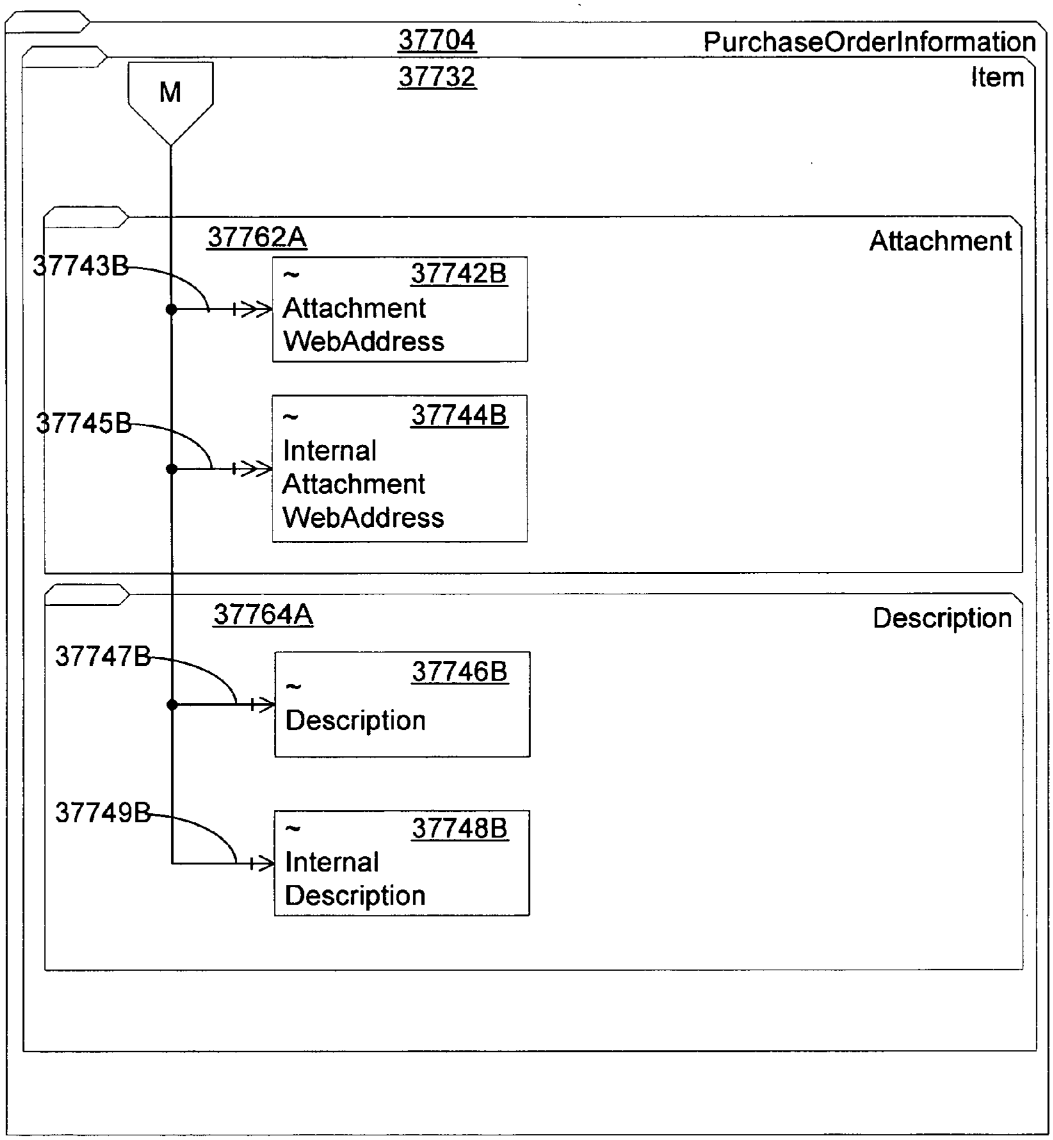
Figure 377M:
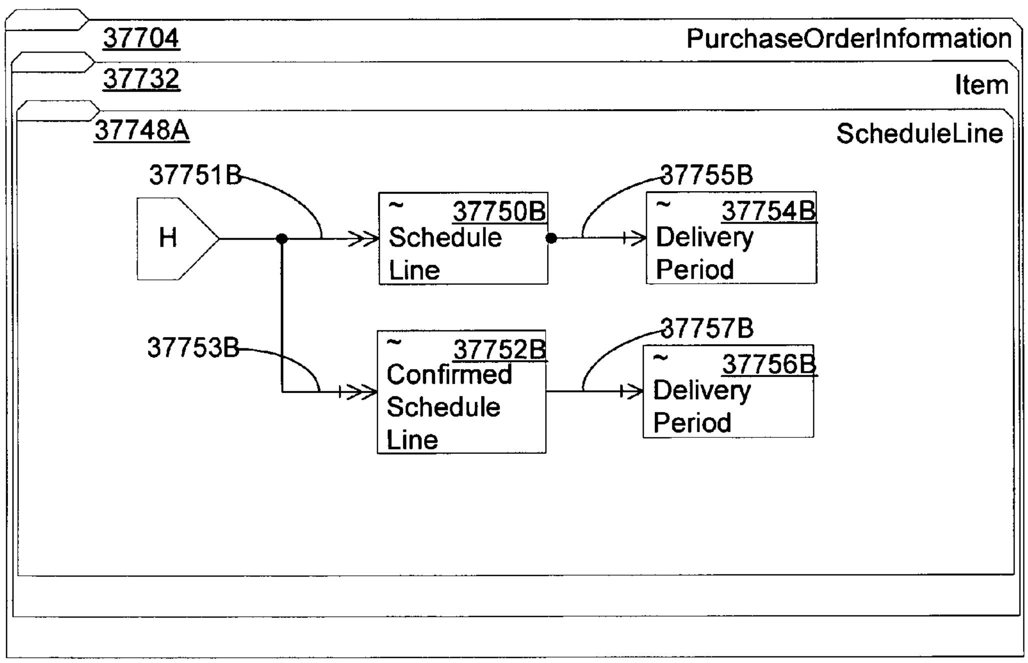
Figure 379:
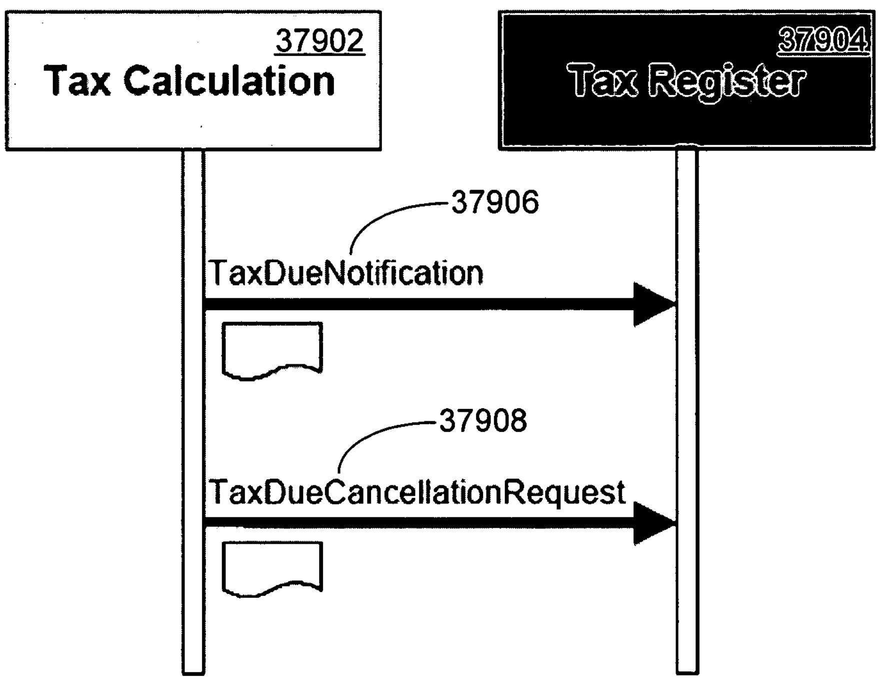
FIG. 379 depicts an example message choreography between a TaxCalculation and a Tax Register application.
Figure 380A:
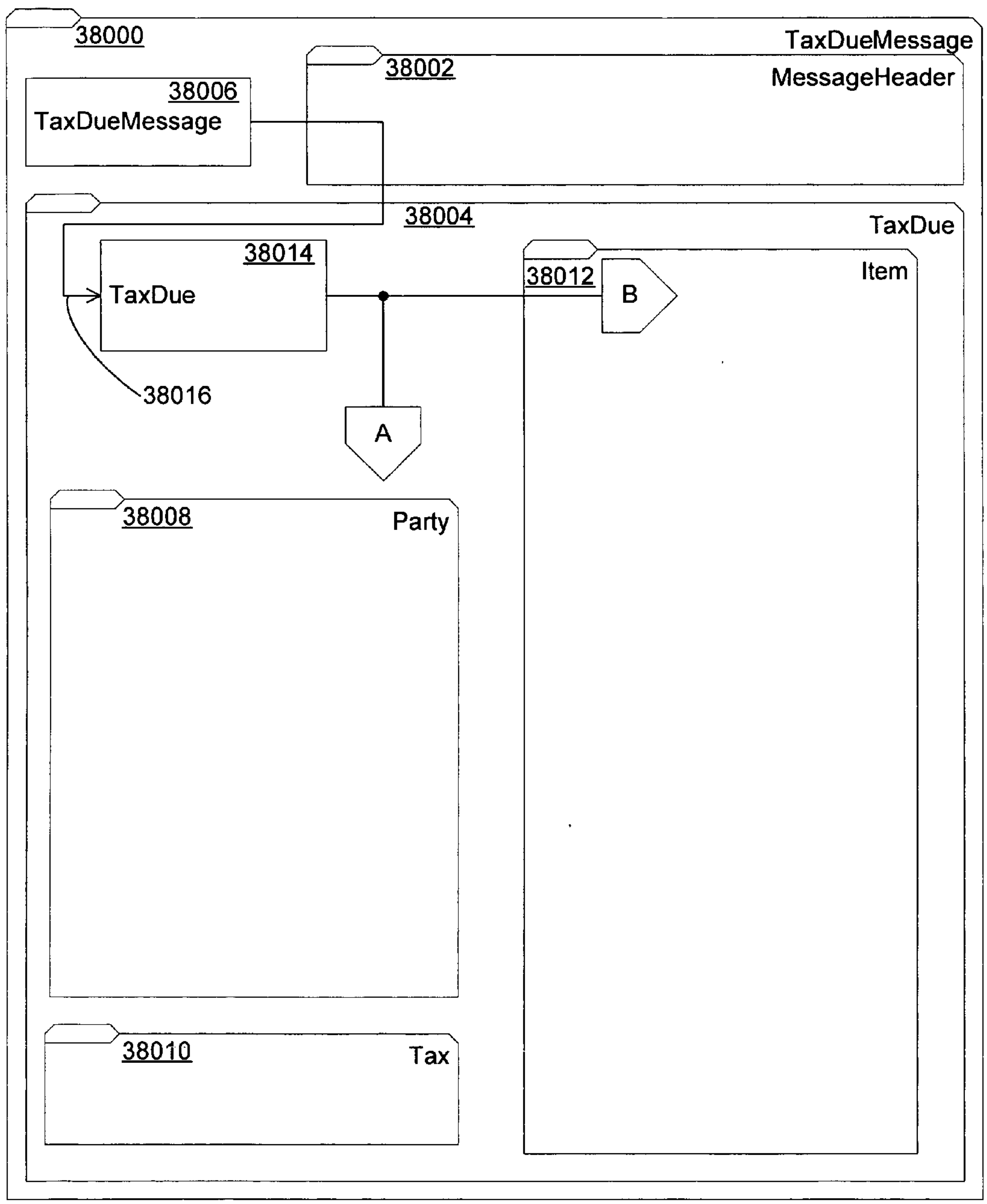
FIGS. 380A-C depict the element structure for a TaxDueNotification and a TaxDueCancellationRequest.
Figure 380B:
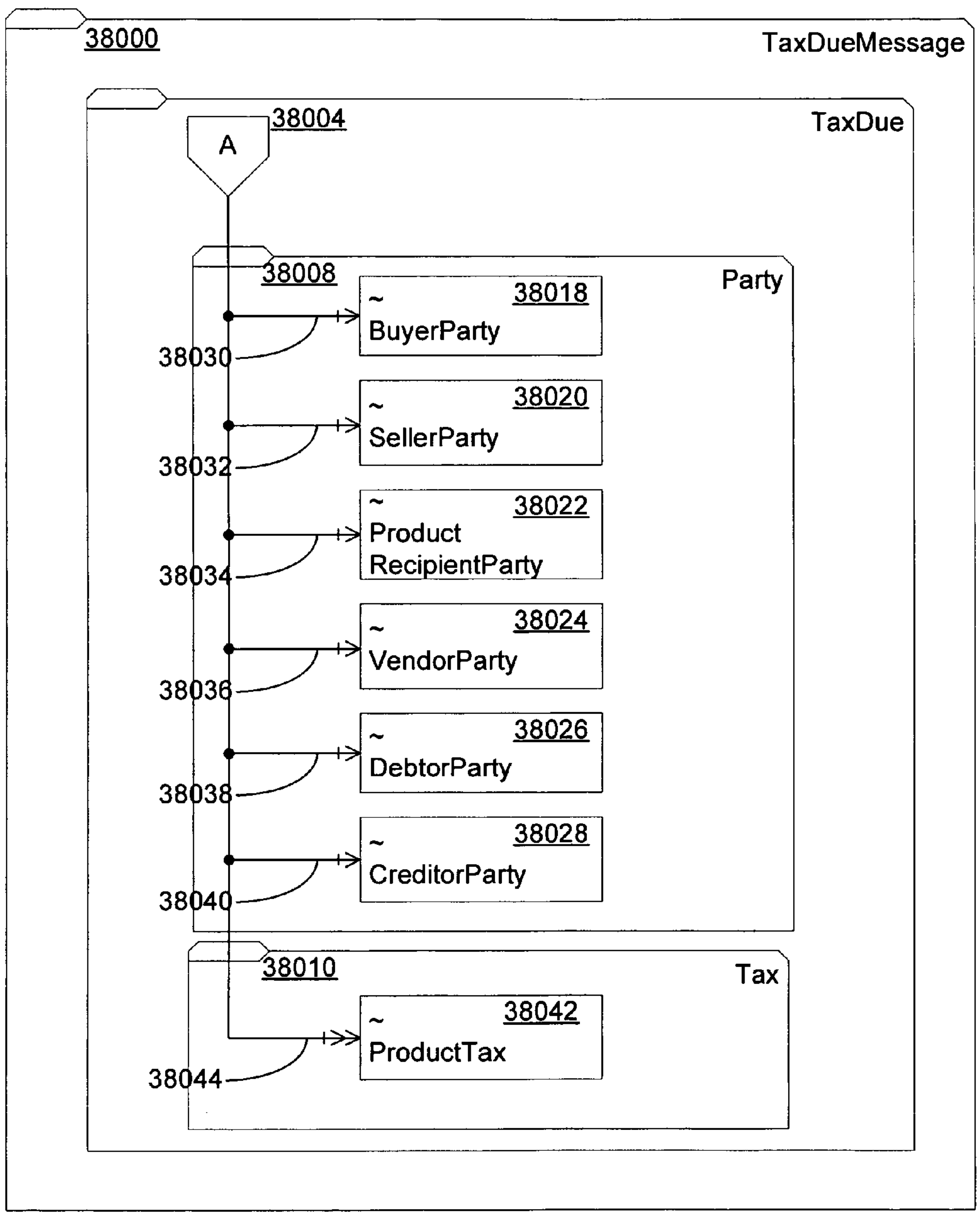
Figure 380C:
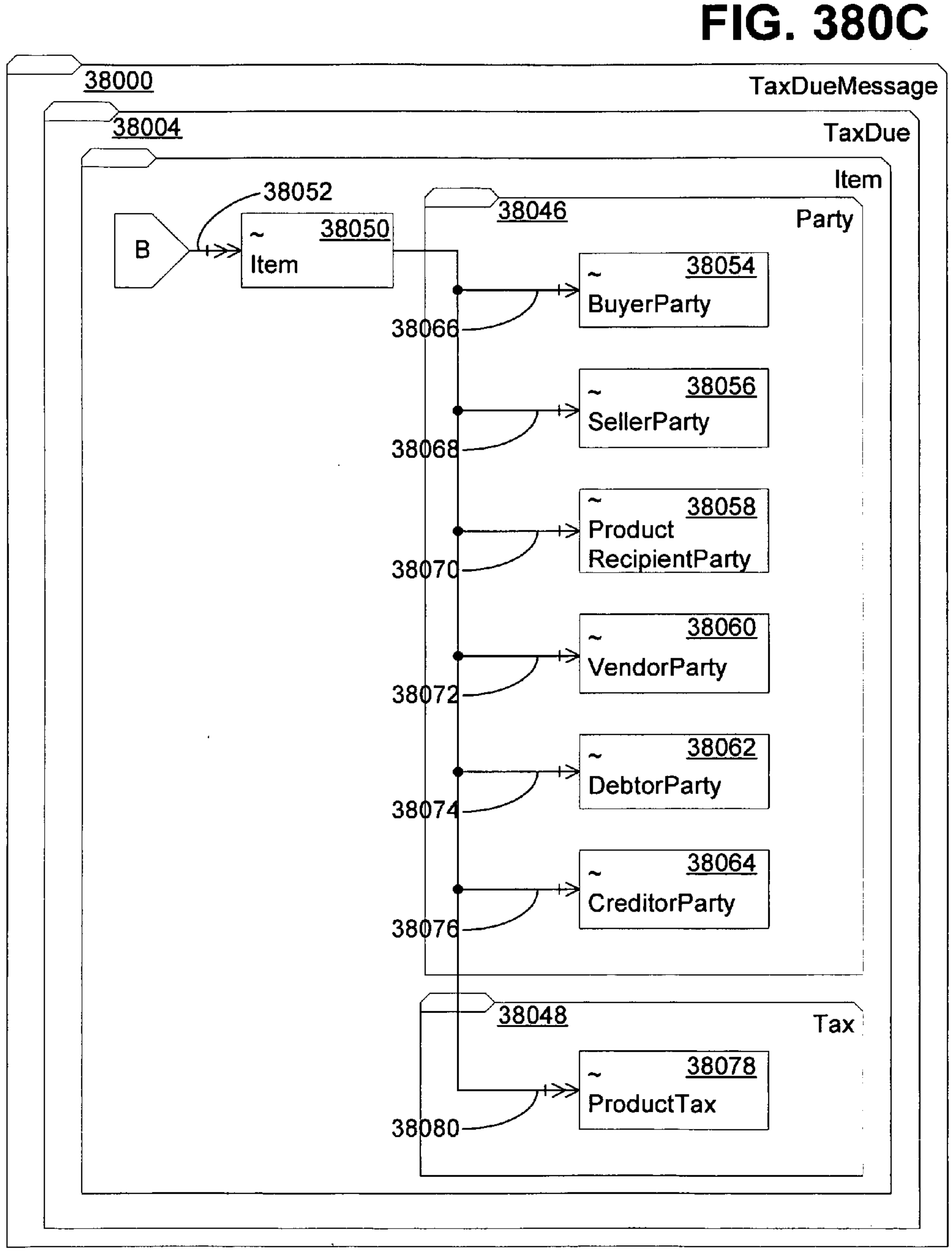

FIG. 376 depicts the Message Choreography for the A2A PurchaseOrderInformation interface established between several different applications, including Sales 37602, Purchasing 37604, FulfillmentCoordination 37606, SupplyChainPlanning 37608, and SupplyChainExecution 37610. Line 37612 denotes a company border. Thus, one company includes Sales 37602, while another company includes SRM 37604, FC 37606, SCP 37608, and SCE 37610.

The SRM 37604 sends a PurchaseOrderRequest message 37614 to the CRM 37602. The SRM 37604 also sends a PurchaseOrderInformation message 37616 to the FC 37606. The FC 37606 then sends the PurchaseOrderInformation message 37618 to the SCP 37608. The CRM 37602 sends a PurchaseOrderConfirmation message 37620 to the SRM 37604. Then the SRM 37604 sends a PurchaseOrderInformation message 37622 to the FC 37606, and the FC 37606 sends the PurchaseOrderInformation message 37624 to the SCP 37608. The FC 37606 sends a DeliveryExecutionRequest message 37626 to the SCE 37610. Alternatively, the SRM 37604 may send the DeliveryExecutionRequest message to the SCE 37610, as depicted by broken line 37628. The SCE 37610 then sends a DeliveryInformation message 37630 to the FC 37606. Next, the FC 37606 sends a DeliveryInformation message 37632 to the SCP 37608. The FC 37606 also sends a DeliveryInformation message 37634 to the SRM 37604.

(a) Process Flow

A PurchaseOrderInformation message is sent by a procurement system when a purchase order is sent to a vendor for the first time, when a purchase order change is sent to a vendor for the first time, when a purchase order cancellation is sent to a vendor, or when a purchase order is confirmed by a vendor.

The PurchaseOrderInformation message is sent independently of the type of communication with the vendor, that is, PurchaseOrderInformation is also sent if the purchase order is sent to the vendor by fax or if a purchase order is confirmed by e-mail and created manually in the procurement system on the user interface. The current purchase order status is transferred in full with every PurchaseOrderInformation message. Data that has not been transferred is implicitly classified as deleted. This is especially the case for items that have not been transferred.

PurchaseOrderInformation messages are sent exactly once in order (EOIO) and serialized using message queues. Each purchase order should have its own message queue (as opposed to one queue for the purchase orders) so that one failed message does not block the other PurchaseOrderInformation messages in the system. In order to restart a process that is corrupt as a result of a failed message, the procurement system provides an option for transferring the current status of a purchase order at any time using a PurchaseOrderInformation message.

(3) Message Data Type Data Model

FIG. 377 depict the data model for the PurchaseOrderInformationMessage. The message data type PurchaseOrderInformationMessage groups together the business information that is relevant for sending a business document in a message and the PurchaseOrderInformation object in the business document. It includes a PurchaseOrderInformationMessage package 37700, which includes a MessageHeader package 37702, a PurchaseOrderInformation package 37704, and a PurchaseOrderInformationMessage entity 37706.

To ensure that the elements and entities in the message data type PurchaseOrderInformationMessage are used correctly with regard to their changeability in an ordering process, if it is specified under "Use/Notes" that the element or entity is not changed, changes are not permitted once the element or entity has been created. The element or entity can be assigned a new value when a purchase order or a new item within a purchase order is created; this value can no longer be changed in other messages. The message data type PurchaseOrderInformationMessage makes the structure available for the message types PurchaseOrderInformation and the relevant interfaces.

(a) Message Header Package

A MessageHeader package 37702 groups together the business information that is relevant for sending a business document in a message. It includes a MessageHeader entity 37708. There is a 1:1 relationship 37709 between the PurchaseOrderInformationMessage entity 37706 and the MessageHeader entity 37708.

(i) Message Header

The MessageHeader groups together business information from the perspective of the sending application to identify the business document in a message, to provide information about the sender, and to provide any information about the recipient.

The MessageHeader entity 37708 includes a SenderParty entity 37710 and a RecipientParty entity 37712. There is a 1:c relationship 37711 between the MessageHeader entity 37708 and the SenderParty entity 37710, and a 1:cn relationship 37713 between the MessageHeader entity 37708 and the RecipientParty entity 37712. The MessageHeader entity 37708 is of type GDT:BusinessDocumentMessageHeader.

The MessageHeader entity 37708 also includes an ID, a ReferenceID, and a CreationDateTime. The MessageID is set by the sending application. With the ReferencedMessageID, reference is made in the current BusinessDocument to a previous BusinessDocument.

(ii) Sender Party

The SenderParty is the party responsible for sending a business document at business application level. The SenderParty entity 37710 is of type GDT: BusinessDocumentMessageHeaderParty. The SenderParty entity 37710 can be filled by the sending application to name a contact person for any problems with the message. This is particularly useful if an additional infrastructure (such as a marketplace) is located between the sender and the recipient. The SenderParty entity 37710 is used to transfer the message, and may be ignored by the receiving application. It should be filled by the sender if the PurchaseOrder package cannot be used to transfer the participating parties. The SenderParty entity 37710 includes the standard information included with parties, as discussed below, as denoted by ellipses 37714.

(iii) Recipient Party

The RecipientParty is the party responsible for receiving a business document at business application level. The RecipientParty entity 37712 is of type GDT:BusinessDocumentMessageHeaderParty. The RecipientParty entity 37712 may be filled by the sending application to name a contact person for any problems that occur with the message. This is particularly useful if an additional infrastructure (such as a marketplace) is located between the sender and the recipient. The RecipientParty entity 37712 is used to transfer the message, and may be ignored by the receiving application. It should be filled by the sender if the PurchaseOrder package cannot be used to transfer the participating parties. The RecipientParty entity 37712 includes the standard information included with parties, as discussed below, as denoted by ellipses 37716.

(b) Purchase Order Information Package

The PurchaseOrderInformation package 37704 includes a Party package 37718, a Location package 37720, a DeliveryInformation package 37722, a PaymentInformation package 37724, an Attachment package 37726, a Description package 37728, a FollowUpBusinessTransactionDocument package 37730, an Item package 37732, and a PurchaseOrderInformation entity 37734. There is a 1:1 relationship 37735 between the PurchaseOrderInformationMessage entity 37706 and the PurchaseOrderInformation entity 37734.

(i) Purchase Order Information

The PurchaseOrderInformation identifies the information about the status of a purchase order. This includes purchase order change, confirmation, or cancellation. The PurchaseOrderInformation entity 37734 is divided into PurchaseOrderInformationItems that each specify an ordered product or additional information relevant for such a product, such as information about bills of material (BOMs) or discount and value limits (see PurchaseOrderInformationItem package).

In addition to the buying party and the seller, additional parties may be involved in the purchase order (see Party package). Locations may be specified for the purchase order delivery (see Location package). Delivery and payment terms may also be agreed upon (see DeliveryInformation package and PaymentInformation package).

Notes or references to attachments may be specified for the purchase order (see Description package and Attachment package). The types of follow-up documents that are expected may also be specified (see FollowUpBusinessTransactionDocument package).

The PurchaseOrderInformation entity 37734 is of type GDT:PurchaseOrderInformation. The PurchaseOrderInformation entity 37734 includes an ID, a BuyerPostingDateTime, a BuyerLastChangeDateTime, and a Note. The ID is a unique identifier specified by the buyer for the purchase order. The BuyerPostingDateTime is the creation date/time of the purchase order at the buyer. The BuyerPostingDateTime is of type GDT:DateTime. The BuyerLastChangeDateTime is the date/time of the last change made to the purchase order by the buyer. The BuyerLastChangeDateTime is of type GDT:DateTime. The Note is a short description or the title of the purchase order. It is generally used to provide the user with a simple method for searching for a particular purchase order. The Note is of type GDT:Note.

Within any given purchase order, monetary amounts and prices are typically in the same currency. Preferably, the ID will not change once a purchase order has been created and the BuyerPostingDateTime will not changed once a purchase order has been created.

(ii) Purchase Order Information Party Package

The Party package 37718 groups together the business parties involved in the purchase order. It includes a Buyer- Party entity 37736, a SellerParty entity 37738, a ProductRecipientParty entity 37740, a VendorParty entity 37742, a ManufacturerParty entity 37744, a BillToParty entity 37746, a PayerParty entity 37748, and a CarrierParty entity 37750. There is a respective 1:c relationship 37737, 37739, 37741, 37743, 37745, 37747, 37749, and 37751 between the PurchaseOrderInformation entity 37734 and the BuyerParty entity 37736, the SellerParty entity 37738, the ProductRecipientParty entity 37740, the VendorParty entity 37742, the ManufacturerParty entity 37744, the BillToParty entity 37746, the PayerParty entity 37748, and the CarrierParty entity 37750.

Either the ID or the ID and address may be transferred for each party. If the ID is transferred, the ID address defined in the master data is used. If the ID and address are transferred, the ID identifies the party and the address is deemed to be a document address that is different from the master data address. A default logic is used for the parties from the header to the items and within item hierarchies. Parties specified in the header are used for the items for which a corresponding party is not explicitly transferred and that are directly assigned to the header. In accordance with the same logic, parties transferred at the item level are used for the subitems assigned to the relevant item in an item hierarchy. The default logic is used for the party as a whole, including the contact person. Parts of a party specified at the header level or for a hierarchy item should not be specified in more detail at the item level. The default logic is a simplified version of the transferred message. As regards logic, parties at the header level and for hierarchy items behave as if they have been explicitly transferred for the subitems of the message.

(a) Buyer Party

The BuyerParty is a party that buys goods or services. The BuyerParty entity 37736 is of type GDT:BusinessTransactionParty. The BuyerParty entity 37736 includes an Address entity 37752 and a Contact entity 37754. There is a 1:c relationship 37753 between the BuyerParty entity 37736 and the Address entity 37752, and a 1:c relationship 37755 between the BuyerParty entity 37736 and the Contact entity 37754.

The Address entity 37752 includes a PersonName entity 37756, an Office entity 37758, a PhysicalAddress entity 37760, a GeoCoordinates entity 37762, and a Communication entity 37764. There is a 1:c relationship 37757 between the Address entity 37752 and the PersonName entity 37756. There is a 1:c relationship 37759 between the Address entity 37752 and the Office entity 37758. There is a 1:c relationship 37761 between the Address entity 37752 and the PhysicalAddress entity 37760. There is a 1:c relationship 37763 between the Address entity 37752 and the GeoCoordinates entity 37762. There is a 1:c relationship 37765 between the Address entity 37752 and the Communication entity 37764.

The Contact entity 37754 includes an Address entity 37766, and there is a 1:c relationship 37767 between the Contact entity 37754 and the Address entity 37766. The Address entity 37766 includes a PersonName entity 37768, an Office entity 37770, a PhysicalAddress entity 37772, a GeoCoordinates entity 37774, and a Communication entity 37776. There is a 1:c relationship 37769 between the Address entity 37766 and the PersonName entity 37768. There is a 1:c relationship 37771 between the Address entity 37766 and the Office entity 37770. There is a 1:c relationship 37773 between the Address entity 37766 and the PhysicalAddress entity 37772. There is a 1:c relationship 37775 between the Address entity 37766 and the GeoCoordinates entity 37774. There is a 1:c relationship 37777 between the Address entity 37766 and the Communication entity 37776.

The same BuyerParty may be used for all of the items in a purchase order. The BuyerParty typically does not change once a purchase order has been created. The BuyerParty should typically be specified.

Changes can be made to the BuyerParty/Contact, and a different BuyerParty/Contact is permitted for each item. Changes can be made to the address of the BuyerParty, but different addresses should not be permitted for each item. If a ProductRecipientParty is not specified in the ordering process, the BuyerParty may also be used as the ProductRecipientParty. If a ProductRecipientParty and ShipToLocation are not specified in the ordering process, the BuyerParty address may be used as the ship-to address. If a BillToParty is not specified in the ordering process, the BuyerParty may also be used as the BillToParty. If a BillToParty and PayerParty are not specified in the ordering process, the BuyerParty may also be used as the PayerParty.

(b) Seller Party

The SellerParty is a party that sells goods or services. The SellerParty entity 37738 is of type GDT:BusinessTransactionDocumentParty. The SellerParty entity 37738 includes the same type of information as the BuyerParty entity 37736, as denoted by ellipses 37778.

The same Seller Party may be used for the items in a purchase order. The Seller Party should not be changed once a purchase order has been created. The Seller Party should typically be specified.

Changes can be made to the SellerParty/Contact and a different SellerParty/Contact is permitted for each item. Changes can be made to the address of the Seller Party, but different addresses should not be permitted for each item. If a VendorParty is not specified in the ordering process, the Seller Party may also be used as the VendorParty. If a VendorParty and ShipFromLocation are not specified in the ordering process, the address of the SellerParty may also be used as the ship-from address for the material items.

(c) Product Recipient Party

The ProductRecipientParty is a party to which goods are delivered or for whom services are provided. The ProductRecipientParty entity 37740 is of type GDT:BusinessTransactionDocumentParty. The ProductRecipientParty entity 37740 includes the same type of information as the BuyerParty entity 37736, as denoted by ellipses 37780.

If a ShipToLocation is not explicitly specified in the ordering process, the ProductRecipientParty address may be used as the ship-to address. The ProductRecipientParty is not synonymous with the ShipToLocation and should be used when the ProductRecipientParty (company or person) is different than the BuyerParty.

(d) Vendor Party

The VendorParty is a party that delivers goods or provides services. The VendorParty entity 37742 is of type GDT:BusinessTransactionDocumentParty. The VendorParty entity 37742 includes the same type of information as the BuyerParty entity 37736, as denoted by ellipses 37782.

If a ShipFromLocation is not specified in the ordering process, the address of the VendorParty may be used as the ship-from address for the material items. The VendorParty is not the company or person that is solely responsible for transporting the goods. Rather, the CarrierParty is responsible for this. The VendorParty is not synonymous with the ShipFromLocation and should be used when the VendorParty (company or person) is different than the SellerParty.

(e) Manufacturer Party

The ManufacturerParty is a party that manufactures goods. The ManufacturerParty entity 37744 is of type GDT:BusinessTransactionDocumentParty. The ManufacturerParty entity 37744 includes the same type of information as the BuyerParty entity 37736, as denoted by ellipses 37784.

The ManufacturerParty entity 37744 may be used for material items. The default logic (from header to item to subitems) is used for material items. For other items, the ManufacturerParty is typically ignored. The ManufacturerParty can be used to uniquely define the context of a ManufacturerProductID.

(f) Bill To Party

The BillToParty is a party to which the invoice for goods or services is sent. The BillToParty entity 37746 is of type GDT: BusinessTransactionDocumentParty. The BillToParty entity 37746 includes the same type of information as the BuyerParty entity 37736, as denoted by ellipses 37786.

If a PayerParty is not specified in the ordering process, the BillToParty may also be used as the PayerParty. Conversely, the BillToParty may not be explicitly derived from the PayerParty.

(g) Payer Party

The PayerParty is a party that pays for goods or services. The PayerParty entity 37748 is of type GDT:BusinessTransactionDocumentParty. The PayerParty entity 37748 includes the same type of information as the BuyerParty entity 37736, as denoted by ellipses 37788.

(h) Carrier Party

The CarrierParty is a party that transports goods. The CarrierParty entity 37750 is of type GDT:BusinessTransactionDocumentParty. The CarrierParty entity 37750 includes the same type of information as the BuyerParty entity 37736, as denoted by ellipses 37790.

The CarrierParty can be used for material items. The default logic (from header to item to subitems) is typically used for material items.

(iii) Purchase Order Information Location Package

The Location package 37720 groups together the locations relevant for the purchase order. It includes a ShipToLocation entity 37792 and a ShipFromLocation entity 37794. There is a 1:c relationship 37793 between the PurchaseOrderInformation entity 37734 and the ShipToLocation entity 37792, and a 1:c relationship 37795 between the PurchaseOrderInformation entity 37734 and the ShipFromLocation entity 37794.

A similar default logic to that used for Parties is also used for locations. Either the ID or the address, or both can be transferred to each location. If the ID is transferred, the ID address defined in the master data is used. If the address is transferred, it is this address that is used (if necessary, a location is assigned at the address recipient). If the ID and address are transferred, the ID identifies the location and the address is deemed to be a document address that is different to the master data address.

(a) Ship To Location

The ShipToLocation is the location to which goods are to be delivered or where services are to be provided. The ShipToLocation entity 37792 is of type GDT: BusinessTransactionDocumentLocation. The ShipToLocation entity 37748 includes an Address entity 37796. There is a 1:c relationship 37797 between the ShipToLocation entity 37792 and the Address entity 37796.

The Address entity 37796 includes a PersonName entity 37798, an Office entity 37700A, a PhysicalAddress entity 37702A, a GeoCoordinates entity 37704A, and a Communication entity 37706A. There is a 1:c relationship 37799 between the Address entity 37796 and the PersonName entity 37798. There is a 1:c relationship 37701A between the Address entity 37796 and the Office entity 37700A. There is a 1:c relationship 37703A between the Address entity 37796 and the PhysicalAddress entity 37702A. There is a 1:c relationship 37705A between the Address entity 37796 and the GeoCoordinates entity 37704A. There is a 1:c relationship 37707A between the Address entity 37796 and the Communication entity 37706A.

(b) Ship From Location

The ShipFromLocation is the location from which goods are to be shipped. The ShipFromLocation entity 37794 is of type GDT:BusinessTransactionDocumentLocation. The ShipFromLocation entity 37794 includes the same type of information as the ShipToLocation entity 37792, as denoted by ellipses 37708A.

The ShipFromLocation entity 37794 may be used for material items. The default logic (from header to item to subitems) is typically used for material items. For the other items, the ShipFromLocation may be ignored.

(iv) Purchase Order Information Delivery Information Package

The DeliveryInformation package 37722 groups together the information for a delivery required for a purchase order. The DeliveryInformation package 37722 includes a DeliveryTerms entity 37710A. A similar default logic to that used for Parties is also used for DeliveryTerms.

The DeliveryTerms entity 37710A includes an Incoterms entity 37712A, a PartialDelivery entity 37714A, a QuantityTolerance entity 37716A, a Transport entity 37718A, and a Description entity 37720B. There is a 1:c relationship 37713A between the DeliveryTerms entity 37710A and the Incoterms entity 37712A. There is a 1:c relationship 37715A between the DeliveryTerms entity 37710A and the PartialDelivery entity 37714A. There is a 1:c relationship 37717A between the DeliveryTerms entity 37710A and the QuantityTolerance entity 37716A. There is a 1:c relationship 37719A between the DeliveryTerms entity 37710A and the Transport entity 37718A. There is a 1:c relationship 37721A between the DeliveryTerms entity 37710A and the Description entity 37720A.

The DeliveryTerms are the conditions and agreements that are valid for executing the delivery and transporting the ordered goods and for the necessary services and activities. The DeliveryTerms entity 37710A is of type GDT:DeliveryTerms. Within the DeliveryTerms, the Incoterms and the transport may be used for material items.

(v) Purchase Order Information Payment Information Package

The PaymentInformation package 37724 groups together the payment information about the purchase order. The PaymentInformation package 37724 includes a CashDiscountTerms entity 37722A and a PaymentForm entity 37724A. There is a 1:c relationship 37723A between the PurchaseOrderInformation entity 37734 and the CashDiscountTerms entity 37722A, and a 1:c relationship 37725A between the PurchaseOrderInformation entity 37734 and the PaymentForm entity 37724A.

The CashDiscountTerms are the terms of payment in an ordering process. The CashDiscountTerms entity 37722A is of type GDT:CashDiscountTerms. The CashDiscountTerms entity 37722A includes a MaximumDiscount entity 37726A and a NormalDiscount entity 37728A. There is a 1:c relationship 37727A between the CashDiscountTerms entity 37722A and the MaximumDiscount entity 37726A and there is a 1:c relationship 37729A between the CashDiscountTerms entity 37722A and the NormalDiscount entity 37728A.

The PaymentForm is the payment form together with the data required. The PaymentForm entity 37724A includes a PaymentFormCode, which is the coded representation of the payment form. The PaymentFormCode is of type GDT:PaymentFormCode. The PaymentForm entity 37724A also includes a PaymentCard entity 37730A. The PaymentCard entity 37730A is of type GDT:PaymentCard, and is a credit card or a customer card. There is a 1:c relationship 37731A between the PaymentForm entity 37724A and the PaymentCard entity 37730A.

(vi) Purchase Order Information Attachment Package

The Attachment package 37726 groups together the attachment information regarding the purchase order. It includes an AttachmentWebAddress entity 37732A and an InternalAttachmentWebAddress entity 37734A. There is a 1:cn relationship 37733A between the PurchaseOrderInformation entity 37734 and the AttachmentWebAddress entity 37732A, and a 1:cn relationship 37735A between the PurchaseOrderInformation entity 37734 and the InternalAttachmentWebAddress entity 37734A.

The AttachmentWebAddress identifies the WebAddress of any document, which is visible to the parties and which refers to the purchase order. The AttachmentWebAddress entity 37732A is of type GDT:AttachmentWebAddress.

The InternalAttachmentWebAddress identifies the WebAddress of any document, which is not visible to the parties and which refers to the purchase order. The InternalAttachmentWebAddress entity 37734A is of type GDT: AttachmentWebAddress.

(vii) Purchase Order Information Description Package

The Description package 37728 groups together the texts regarding the purchase order. The Description package 37728 includes a Description entity 37736A and an InternalDescription entity 37738A. There is a 1:c relationship 37737A between the PurchaseOrderInformation entity 37734 and the Description entity 37736A, and a 1:c relationship 37739A between the PurchaseOrderInformation entity 37734 and the InternalDescription entity 37738A.

The Description is a natural-language text regarding the purchase order, which is visible to business parties. The Description entity 37736A is of type GDT:Description. The Description can be used for the types of textual information about the transferred purchase order and not just the current message. An example of this would be information stating that the Purchasing employee responsible is on vacation as of a specific date, and indicating the name and telephone number of a substitute as of this date.

An InternalDescription is a natural-language text regarding the purchase order, which is not visible to business parties. The InternalDescription entity 37738A is of type GDT: Description.

(viii) Purchase Order Information Follow-Up Message Package

The FollowUpMessage package 37730 groups together the information about subsequent messages that the buyer expects to receive from the seller with regard to the purchase order. The FollowUpMessage package 37730 includes a FollowUpPurchaseOrderConfirmation entity 37740A, a FollowUpDespatchedDeliveryNotification entity 37742A, a FollowUpServiceAcknowledgementRequest entity 37744A, and a FollowUpInvoiceRequest entity 37746A. There is a respective 1:c relationship 37741A, 37743A, 37745A, and 37747A between the PurchaseOrderInformation entity 37734 and the FollowUpPurchaseOrderConfirmation entity 37740A, the FollowUpDespatchedDeliveryNotification entity 37742A, the FollowUpServiceAcknowledgementRequest entity 37744A, and the FollowUpInvoiceRequest entity 37746A.

The FollowUpPurchaseOrderConfirmation identifies information about whether and in what form the buyer expects to receive confirmation of the purchase order from the seller. The FollowUpPurchaseOrderConfirmation entity 37740A includes a RequirementCode, which is a coded representation of information about whether the buyer expects to receive confirmation of the purchase order from the seller. The RequirementCode is of type GDT: FollowUpMessageRequirementCode. The RequirementCode may have the values "02" (Expected) and "04" (Unexpected).

The FollowUpDespatchedDeliveryNotification identifies information about whether the buyer wants to be informed by the seller of any outbound deliveries. The FollowUpDespatchedDeliveryNotification entity 37742A includes a RequirementCode, which is a coded representation of information about whether the buyer expects the seller to send notification of any outbound deliveries of the ordered goods. The RequirementCode is of type GDT:FollowUpMessageRequirementCode. The RequirementCode may have the values "02" (Expected) and "04" (Unexpected).

The FollowUpServiceAcknowledgementRequest identifies information about whether the buyer wants to be informed by the seller of any services provided. The FollowUpServiceAcknowledgementRequest entity 37744A includes a RequirementCode, which is a coded representation of information about whether the buyer wants to be informed by the seller of any services provided. The RequirementCode is of type GDT: FollowUpMessageRequirementCode. The RequirementCode may have the values "02" (Expected) and "04" (Unexpected). The RequirementCode may be changed by the buyer. If the buyer changes the RequirementCode from "Unexpected" to "Expected" during an ordering process, the seller should inform the buyer of the new services provided once the change has been received. If the buyer changes the RequirementCode from "Expected" to "Unexpected," the seller should not send any further information about services provided. The seller can transfer the confirmation of the services either electronically using a ServiceAcknowledgementRequest message or by traditional methods of communication, such as e-mail or fax. In addition to service items, a confirmation of a service also can contain planned or unplanned material items for materials that were required when the service was provided.

The FollowUpInvoiceRequest identifies information about whether the buyer expects to receive an invoice from the seller. The FollowUpInvoiceRequest entity 37746A includes a RequirementCode and an EvaluatedReceiptSettlementIndicator. The RequirementCode is a coded representation of information about whether the buyer expects to receive an invoice from the seller. The RequirementCode is of type GDT:FollowUpMessageRequirementCode. The EvaluatedReceiptSettlementIndicator indicates whether or not the purchase order settlement is to be processed automatically by the goods receipt, without an invoice. The EvaluatedReceiptSettlementIndicator is of type GDT:EvaluatedReceiptSettlementIndicator. The RequirementCode may have the values "01" (Required) and "05" (Forbidden). If the EvaluatedReceiptSettlementIndicator is set to "true," the RequirementCode should be set to "Forbidden."

(ix) Purchase Order Information Item Package

The PurchaseOrderInformationItem package 37732 includes a ScheduleLine package 37748, a ProductInformation package 37750A, a PriceInformation package 37752A, a Party package 37754A, a Location package 37756A, a DeliveryInformation package 37758A, a BusinessTransactionDocumentReference package 37760A, an Attachment package 37762A, a Description package 37764A, and a PurchaseOrderItem entity 37766A. There is a 1:cn relationship 37765A between the PurchaseOrderInformation entity 37734 and the PurchaseOrderItem entity 37766A. Items are arranged hierarchically using a Hierarchy Relationship 37768A. The Hierarchy Relationship 37768A is the relationship between a sub-item and a higher-level parent item in an item hierarchy. There is a 1:cn relationship 37767A between the Item entity 37766A and its subordinate entities, and a 1:c relationship 37769A between the Item entity 37766A and its superordinate entities.

(a) Purchase Order Information Item

The PurchaseOrderInformationItem specifies a product ordered by the purchase order or additional information about ordered products. This information includes specifications on discounts in kind, substitute products, and value limits. The PurchaseOrderInformationItem entity 37774 includes detailed information about a particular product (see Product package) and its price (see PriceInformation package). The quantity of the product and (delivery) dates are specified in the schedule line (see ScheduleLine package).

For the PurchaseOrderInformationItem entity 37766A (compared to the information of the PurchaseOrderInformation), deviating parties, locations, and delivery terms may be defined (see Party package, Location package, and DeliveryInformation package). The PurchaseOrderInformationItem entity 37766A may contain references to other business documents that are relevant for the item (see BusinessTransactionDocumentReference package). Notes or references to attachments can also be specified for the PurchaseOrderInformationItem (see Description package and Attachment package).

A PurchaseOrderInformationItem entity 37766A can be subordinate to another PurchaseOrderInformationItem within a hierarchy to represent a business relationship between the two items. This could be information about a discount in kind or substitute product for an ordered product, for example. This relationship can also be used to group together purchase order items, that is, a PurchaseOrderInformationItem can group together other PurchaseOrderInformationItems. The PurchaseOrderInformationItem 37766A is of type GDT: PurchaseOrderInformationItem.

The PurchaseOrderInformationItem entity 37766A includes an ID and a ConfirmedInformationOutdatedIndicator. The ID is the identifier assigned by the buyer to a purchase order item. The identifier is unique within a particular purchase order. The ID is of type GDT:BusinessTransactionDocumentItemID. The ConfirmedInformationOutdatedIndicator indicates whether the confirmation information ConfirmedPrice and ConfirmedScheduleLine transferred with the item refers to the current purchase order status or whether it is outdated because changes have been made to the purchase order. The ConfirmedInformationOutdatedIndicator is of type GDT:InformationOutdatedIndicator.

From a semantic point of view, items can contain other items. This enables item hierarchies to be mapped. From a technical point of view, the item type is not defined recursively, since this cannot be handled by some commonly-used XML tools. The hierarchies are mapped using the entity HierarchyRelationship. There are various item categories, which are governed by a variety of constraints. An item can have several constraint types. In this case, the item satisfies the constraints of its constraint types. Which constraint types can be combined with one another and how is specified in the description of the constraint types. The following constraint types exist: (1) Standard items are the items to which no lower-level items have been assigned in the hierarchy. An item that is not referenced by another item, using the ParentItemID is a standard item; (2) Hierarchy items are items to which at least one other lower-level item has been assigned in the hierarchy. An item that is referenced by at least one other item, using the ParentItemID is a hierarchy item. Items are typically either standard or hierarchy items; (3) Subitems are items that have been assigned below a hierarchy item and not directly to the purchase order header. Subitems can be both standard items and hierarchy items. A subitem is an item that references another item using the ParentItemID; (4) Material items are items whose product is a material. Items whose ProductTypeCode is “1” (Material) are material items; (5) Service items are items whose product is a service. Items whose ProductTypeCode is “2” (Service) are service items; (6) Unspecified product items are items for which it is not specified whether they refer to a material or a service. Items whose ProductTypeCode is not specified are unspecified product items. Items are material, service, or unspecified product items. An unspecified product item satisfies the constraints of a material, service, or limit item; (7) Grouping hierarchy items are hierarchy items that logically group together other items. Multilevel grouping hierarchies are permitted, that is, a grouping hierarchy item can contain subitems that are also grouping hierarchy items. Hierarchy items whose subitems have HierarchyRelationshipTypeCode “002” (Group) are grouping hierarchy items; subitems with a different HierarchyRelationshipTypeCode are not permitted. Grouping hierarchy items are not permitted to be subitems of other types of hierarchy items; (8) Substitute product hierarchy items are hierarchy items for which at least one subitem with a substitute product exists. Multilevel substitute product hierarchies are not permitted, that is, a substitute product cannot be substituted. Hierarchy items whose subitems have HierarchyRelationshipTypeCode “006” (Substitute Product) are substitute product hierarchy items; subitems with a different HierarchyRelationshipTypeCode are not permitted. Substitute product hierarchy items can be used as subitems in grouping hierarchies. Substitute product subitems can be transferred in the PurchaseOrderConfirmation message. The buyer can reject proposed substitute products by cancelling the entire associated substitute product hierarchy item; (9) BOM hierarchy items are hierarchy items that group together other items in a BOM. Multilevel BOM hierarchies are permitted. Hierarchy items with at least one subitem with HierarchyRelationshipTypeCode “001” (Bill of Material) are BOM hierarchy items; additional subitems are permitted with the HierarchyRelationshipTypeCode “003” (Discount in Kind); (10) Discount in kind hierarchy items are hierarchy items for which a goods discount is granted in the form of an inclusive or exclusive bonus quantity. Multilevel discount in kind hierarchies are not permitted, that is, no discount in kind can be granted for discount in kind. The goods discount is described in the form of one or more subitems in the discount in kind hierarchy item. Hierarchy items with at least one subitem with HierarchyRelationshipTypeCode “003” (Discount in Kind) are discount in kind hierarchy items; additional subitems are permitted with the HierarchyRelationshipTypeCode “001” (Bill of Material). Hierarchy items are grouping, BOM, or discount in kind hierarchy items. A hierarchy item can be both a BOM and discount in kind hierarchy item, if a discount in kind has been granted for a BOM; (11) Limit items are both standard and unspecified product items for which the exact requirements are unknown at the time of ordering. Items with a ProcurementCostUpperLimit are limit items. Limit items are not permitted to be subitems of BOM or discount in kind hierarchy items. No substitute product subitems are permitted for limit items. Dependencies between elements or entities of this item category are described under “Notes” for the relevant element or entity.

(b) Hierarchy Relationship

A HierarchyRelationship is the relationship between a subitem and a higher-level parent item in an item hierarchy. The HierarchyRelationship 37768A includes a ParentItemID and a TypeCode. The ParentItemID is the reference to the parent item with the item number assigned by the buyer. The ParentItemID is of type GDT:BusinessTransactionDocumentItemID. The TypeCode represents the hierarchical relationship between the subitem and its higher-level parent item. The TypeCode is of type GDT: BusinessTransactionDocumentItemHierarchyRelationshipTypeCode. The ParentItemID and the TypeCode typically do not changed once an item has been created.

(c) Purchase Order Information Item Product Information Package

The ProductInformation package 37750A groups together the information for identifying, describing, and classifying a product in an ordering process. It includes a Product entity 37770A and a ProductCategory entity 37772A. There is a 1:c relationship 37771A between the PurchaseOrderItem entity 37766A and the Product entity 37770A, and a 1:c relationship 37772A between the PurchaseOrderItem entity 37766A and the ProductCategory entity 37772A. The product package is not used in grouping hierarchy items.

The Product includes the details about a product as generally understood from a commercial point of view in business documents. These are the details for identifying a product and product type, and the description of the product. The Product entity 37770A is of type GDT: BusinessTransactionDocumentProduct. For limit items, the description (Note) can be used in the Product entity 37770A. The product number and ProductTypeCode are typically not used. The ProductTypeCode typically does not change once an item has been created. With the exception of grouping hierarchy items, at least the product number or the product description (Note) is specified when a new item is created. If both the product number and description are specified, the description is additional information in the message and can typically be ignored by the recipient. In substitute product subitems, the ProductTypeCode is the same as the parent item ProductTypeCode. In substitute product subitems, the product is the substitute product proposed by the vendor for the product ordered in the associated substitute product hierarchy item.

The ProductCategory includes the details about a product category as generally understood from a commercial point of view in business transaction documents. It includes details for identifying the product category using an internal ID, a standard ID, and IDs assigned by involved parties. The ProductCategory entity 37772A is of type GDT: BusinessTransactionDocumentProductCategory.

(d) Purchase Order Information Item Price Information Package

The PriceInformation package 37752A groups together the price information in an order item. The Price package includes a Price entity 37774A, a ConfirmedPrice entity 37776A, and a ProcurementCostUpperLimit entity 37778A. There is a respective 1:c relationship 37775A, 37777A, and 37779A between the PurchaseOrderItem entity 37766A and the Price entity 37774A, the ConfirmedPrice entity 37776A, and the ProcurementCostUpperLimit entity 37778A.

The Price is typically not used in grouping hierarchy and discount in kind items. The ProcurementCostUpperLimit is typically used for limit items, whereas the Price and the Confirmed Price are typically not used. The ProcurementCostUpperLimit is typically not used for any items other than limit items. The PriceInformation package 37752A for a purchase order item includes prices; it typically does not contain any information about how the prices are calculated (pricing scales, and so on).

(i) Price

The Price is the order price specified by the buyer. The Price entity 37774A includes a NetUnitPrice, which is the net price specified by the buyer for the base quantity (without tax or cash discount) of the product. The NetUnitPrice is of type GDT:Price.

In BOM hierarchies: (1) if the price is specified for the item at the top of the BOM hierarchy and not for the subitems, this price applies; (2) if the price is specified for standard items (end nodes in the hierarchy tree) in the BOM hierarchy, these prices apply, where the price of the entire BOM is the total of the individual prices; and (3) if a price is specified at different levels in the BOM hierarchy, the price that appears above the others in the tree applies. Differences between the total of the individual prices and the price at the next highest hierarchy level are permissible. These may be caused by discounts for the entire BOM. In substitute product subitems, the Price can be used to transfer substitute product prices. The same rules apply here as for the Price in BOM hierarchies.

(ii) Confirmed Price

The ConfirmedPrice is the purchase order price confirmed by the seller. The ConfirmedPrice entity 37776A includes a NetUnitPrice, which is the net price (without tax or cash discount) confirmed by the seller for the base quantity of the product. The NetUnitPrice is of type GDT:Price. In BOM and substitute product hierarchies, the same rules apply for the ConfirmedPrice as for the Price.

(iii) Procurement Cost Upper Limit

The ProcurementCostUpperLimit is the cost upper limit for different types of procurement costs. The ProcurementCostUpperLimit entity 37778A is of type GDT:ProcurementCostUpperLimit. The ProcurementCostUpperLimit entity 37778A is typically used to define the type and amount of costs that are permitted for limit items within an ordering process. Limit items are used as placeholders in purchase orders if the exact requirements are unknown at the time of ordering. This can be the case for repairs, where the time and spare parts required are not known until the repair has been made.

(e) Purchase Order Information Item Party Package

The PurchaseOrderInformationItemParty Package 37754A is similar to the Party package 37718 at the header level. The PurchaseOrderInformationItemParty Package 37754A includes a BuyerParty entity 37780A, a SellerParty entity 37782A, a ProductRecipientParty entity 37784A, a VendorParty entity 37786A, a ManufacturerParty entity 37788A, a BillToParty entity 37790A, a PayerParty entity 37792A, and a CarrierParty entity 37794A. There is a respective 1:c relationship 37781A, 37783A, 37785A, 37787A, 37789A, 37791A, 37793A, and 37795A between the PurchaseOrderItem entity 37766A and the BuyerParty entity 37780A, the SellerParty entity 37782A, the ProductRecipientParty entity 37784A, the VendorParty entity 37786A, the ManufacturerParty entity 37788A, the BillToParty entity 37790A, the PayerParty entity 37792A, and the CarrierParty entity 37794A. Each of the BuyerParty entity 37780A, the SellerParty entity 37782A, the ProductRecipientParty entity 37784A, the VendorParty entity 37786A, the ManufacturerParty entity 37788A, the BillToParty entity 37790A, the PayerParty entity 37792A, and the CarrierParty entity 37794A includes the same type of information as the BuyerParty entity 37736 above, as denoted by ellipses 37796A, 37798A, 37700B, 37702B, 37704B, 37706B, 37708B, and 37710B.

(f) Purchase Order Information Item Location Package

The PurchaseOrderInformationItemLocation Package 37756A is similar to the Location package 37720 at the header level. The PurchaseOrderInformationItemLocation Package 37756A includes a ShipToLocation entity 37712B and a ShipFromLocation entity 37714B. There is a 1:c relationship 37713B between the PurchaseOrderItem entity 37766A and the ShipToLocation entity 37712B, and there is a 1:c relationship 37715B between the PurchaseOrderItem entity 37766A and the ShipFromLocation entity 37714B. The ShipToLocation entity 37712B and the ShipFromLocation entity 37714B include the same type of information as the ShipToLocation entity 37792, as denoted by ellipses 37716B and 37718B.

(g) Purchase Order Information Item Delivery Information Package

The PurchaseOrderInformationDeliveryLocation Package 37758A is similar to the DeliveryInformation package 37722 at the header level. The PurchaseOrderInformationDeliveryLocation Package 37758A includes DeliveryTerms entity 37720B. There is a 1:c relationship 37721B between the PurchaseOrderInformationItem entity 37766A and the DeliveryTerms entity 37720B.

The DeliveryTerms entity 37720B includes an Incoterms entity 37722B, a PartialDelivery entity 37724B, a QuantityTolerance entity 37726B, a Transport entity 37728B, and a Description entity 37730B. There is a 1:c relationship 37723B between the DeliveryTerms entity 37720B and the Incoterms entity 37722B. There is a 1:c relationship 37725B between the DeliveryTerms entity 37720B and the PartialDelivery entity 37724B. There is a 1:c relationship 37727B between the DeliveryTerms entity 37720B and the QuantityTolerance entity 37726B. There is a 1:c relationship 37729B between the DeliveryTerms entity 37720B and the Transport entity 37728B. There is a 1:c relationship 37731B between the DeliveryTerms entity 37720B and the Description entity 37730B.

(h) Purchase Order Information Item Business Transaction Document Reference Package The BusinessTransactionDocumentReference package 37760A groups together the references to business documents that are relevant for the PurchaseOrderInformationItem and have a business relationship with the item. The BusinessTransactionDocumentReference package 37760A includes a QuoteReference entity 37732B, a PurchaseContractReference entity 37734B, an OriginPurchaseOrderReference entity 37736B, a BuyerProductCatalogueReference entity 37738B, and a SellerProductCatalogueReference entity 37740B. There is a respective 1:c relationship 37733B, 37735B, 37737B, 37739B, and 37741B between the PurchaseOrderItem entity 37766A and the QuoteReference entity 37732B, the PurchaseContractReference entity 37734B, the OriginPurchaseOrderReference entity 37736B, the BuyerProductCatalogueReference entity 37738B, and the SellerProductCatalogueReference entity 37740B. None of the entities in the BusinessTransactionDocumentReference package 37760A should be used in grouping hierarchy items.

Individual items in business documents should be referenced in the purchase order messages from the item level. If an item assignment is not recognized, an entire document can be referenced. In this case, the recipient cannot demand that the item numbers in both documents be the same. It is the responsibility of the recipient to try to make this assignment using other criteria that are not necessarily unique, such as the product number. References are used for establishing relationships between different documents. If a reference has been provided, the data relevant to the purchase order is transferred from the document referenced in the purchase order message (the product number in a purchase order item is transferred even if the product number can be derived directly from a bid reference). The data in the purchase order message can differ in any number of ways from the referenced documents. The recipient is able to respond appropriately to such deviations.

A QuoteReference is a reference to a quotation or an item within a quotation. The QuoteReference entity 37732B is of type GDT:BusinessTransactionDocumentReference. The QuoteReference entity 37732B may reference one item, that is, one ItemID is permissible.

A PurchaseContractReference is a reference to a purchase contract or item in a purchase contract. The PurchaseContractReference entity 37734B is of type GDT: BusinessTransactionDocumentReference. In limit items, multiple contract references are possible; a maximum of one contract reference is permissible in other item types. A PurchaseContractReference entity 37734B can reference one item, that is, one ItemID is permissible. Unless otherwise agreed, the seller is responsible for determining the correct PurchaseContractReference for a specified SellerContractReference.

An OriginPurchaseOrderReference is a reference to the origin purchase order or to an item within the origin purchase order in a third-party deal. The OriginPurchaseOrderReference entity 37736B is of type GDT:BusinessTransactionDocumentReference. An OriginPurchaseOrderReference entity 37736B can reference one item, that is, one ItemID is permissible. The OriginPurchaseOrderReference 37736B is used in the purchase orders in a third-party deal, so that the seller can reference the original purchase order of the ShipToParty with the OriginPurchaseOrderReference.

A BuyerProductCatalogueReference is a reference to the buyer's product catalogue or an item within the buyer's product catalogue. The BuyerProductCatalogueReference entity 37738B is of type GDT:CatalogueReference. A BuyerProductCatalogueReference entity 37738B can reference one item, that is, one ItemID is permissible. The BuyerProductCatalogueReference entity 37738B should be filled if a purchase order item refers to a catalogue whose number and item numbers were assigned by the buyer. In the ordering process, the BuyerProductCatalogueReference can be used as a substitute product number if the product is defined in a catalogue rather than having its own master record.

A SellerProductCatalogueReference is a reference to the seller's product catalogue or an item within the seller's product catalogue. The SellerProductCatalogueReference entity 37740B is of type GDT:CatalogueReference. A SellerProductCatalogueReference entity 37740B can reference one item, that is, one ItemID is permissible. The SellerProductCatalogueReference entity 37740B should be filled if a purchase order item refers to a catalogue whose number and item numbers were assigned by the seller. In the ordering process, the SellerProductCatalogueReference can be used as a substitute product number if the product is defined in a catalogue rather than having its own master record.

(i) Purchase Order Information Item Attachment Package

The PurchaseOrderInformationItemAttachment Package is similar to the Attachment package 37726 at the header level. The PurchaseOrderInformationItemAttachment Package 37762A includes an AttachmentWebAddress entity 37742B and an InternalAttachmentWebAddress entity 37744B. There is a 1:cn relationship 37743B between the PurchaseOrderInformationItem entity 37766A and the AttachmentWebAddress entity 37742B, and a 1:cn relationship 37745B between the PurchaseOrderInformationItem entity 37766A and InternalAttachmentWebAddress entity 37744B.

(j) Purchase Order Information Item Description Package

The PurchaseOrderInformationItemDescription Package 37764A is similar to the Description package 37728 at the header level. The PurchaseOrderInformationItem-Description Package 37764A includes a Description entity 37746B and an InternalDescription entity 37748B. There is a 1:c relationship 37747B between the PurchaseOrderInformationItem entity 37766A and the Description entity 37746B, and a 1:c relationship 37749B between the PurchaseOrderInformationItem entity 37766A and the InternalDescription entity 37748B.

(k) Purchase Order Information Item Schedule Line Package

A ScheduleLine package 37748A groups together the quantity and date information about a PurchaseOrderInformationItem. The ScheduleLine package 37748A includes a ScheduleLine entity 37750B and a ConfirmedScheduleLine entity 37752B. There is a 1:n relationship 37751B between the PurchaseOrderItem entity 37766A and the ScheduleLine entity 37750B, and a 1:cn relationship 37752B between the PurchaseOrderItem entity 37766A and the ConfirmedScheduleLine entity 37752B.

There is no direct relationship between the ScheduleLine entity 37750B and the ConfirmedScheduleLine entity 37752B. This has the advantage that the case "10 pieces for 01/01 and 10 pieces for 02/01" ordered as "20 pieces for 02/01" can be confirmed simply and without interpretation on the part of the applications.

(i) Schedule Line

A ScheduleLine is a line containing the quantity and date of a performance schedule required by the buyer for a purchase order. The ScheduleLine entity 37750B is of type GDT: PurchaseOrderInformationItemScheduleLine. The ScheduleLine entity 37750B includes a DeliveryPeriod entity 37754B. There is a 1:c relationship 37755B between the ScheduleLine entity 37750B and the DeliveryPeriod entity 37754B.

The ScheduleLine 37750B also includes an ID, a DeliveryPeriod, and a Quantity. The ID is the ScheduleLine number assigned by the procurement system. The ID is of type GDT: ScheduleLineID. The DeliveryPeriod is the period in which the buyer expects a product to be delivered or service provided. The DeliveryPeriod is of type GDT:DateTimePeriod. The Quantity is the purchase order quantity. The Quantity is of type GDT:Quantity.

Multiple ScheduleLines for a purchase order item with identical DeliveryPeriod should not be permitted. All of the ScheduleLines for a particular item typically use the same unit of measure. ScheduleLines should not be used for grouping hierarchy items. In this case, the ScheduleLines is explicitly specified for the subitems. ScheduleLines do not have to be specified for limit items. At least one ScheduleLine is specified for the other item types. Within a ScheduleLine, the quantity is not used for limit items. For the other types of items, the quantity is specified. In the ScheduleLines of subitems for discount in kind and BOM hierarchy items, the DeliveryPeriod of the subitems is identical to the DeliveryPeriod of the relevant parent items. In the ScheduleLines of substitute product subitems, the DeliveryPeriod of the subitems is identical to the DeliveryPeriod of the relevant parent items. The quantities and confirmed quantities of the subitems should be added to the quantities of the parent items, and where deviations occur, the quantities of subitems are typically regarded as the valid quantities. The ID is optional; i.e., a procurement system does not have to number the ScheduleLines.

(ii) Confirmed Schedule Line

A ConfirmedScheduleLine is a line containing the quantity and date of a performance schedule confirmed by the seller for a purchase order. The ConfirmedScheduleLine entity 37752B is of type GDT:PurchaseOrderInformationItem-ScheduleLine. There is a 1:cn relationship 37753B between the PurchaseOrderInformationItem entity 37766A and the ConfirmedScheduleLine entity 37752B. The ConfirmedScheduleLine entity 37752B includes a DeliveryPeriod entity 37756B. There is a 1:c relationship 37757B between the ConfirmedScheduleLine entity 37752B and the DeliveryPeriod entity 37756B.

The ConfirmedScheduleLine entity 37752B also includes an ID, a DeliveryPeriod, and a Quantity. The ID is the ConfirmedScheduleLine number assigned by the procurement system. The ID is of type GDT:ScheduleLineID. The DeliveryPeriod is the period in which the seller provides the buyer with confirmation of a delivery or the provision of a service. The DeliveryPeriod is of type GDT:DateTimePeriod. The Quantity is the quantity confirmed by the seller. The Quantity is of type GDT:Quantity.

Multiple ConfirmedScheduleLines are typically not permitted for a purchase order item with identical DeliveryPeriod. The same rules apply for the use of the ConfirmedScheduleLine for the various item types as described for the ScheduleLine. Confirmation of a partial quantity does not mean cancellation of the remaining quantity. It simply means that the seller has agreed to this partial quantity and has not yet made a decision about the remaining quantity. In order to cancel a remaining quantity, the seller reduces the quantity of the ScheduleLine (not that of the ConfirmedScheduleLine) accordingly.

(4) Message Data Type Element Structure

The message data type element structure for the PurchaseOrderInformation is depicted in FIG. 378. The element structure is similar to the data model, but provides additional information regarding the details of the interface. The element structure identifies the different packages 37800 in the interface, and represents the entities at various levels within the interface. As depicted in FIG. 378, the interface for PurchaseOrderInformation includes five levels 37802, 37804, 37806, 37808, and 37810. The element structure identifies the cardinality or occurrence 37812 and the data type 37814 information for the elements at the respective levels 37802, 37804, 37806, 37808, 37810 in the respective package 37800.

The outermost package of this interface is a PurchaseOrderInformationMessage package 37816, which includes a PurchaseOrderInformationMessage entity 37818 at the first level 37802. The PurchaseOrderInformationMessage entity 37818 is of type GDT PurchaseOrderInformationMessage 37820.

The PurchaseOrderInformationMessage package 37816 includes a MessageHeader package 37822 and a PurchaseOrderInformation package 37824. The MessageHeader package 37822 includes a MessageHeader entity 37826 at the second level 37804. The MessageHeader entity 37826 is of type GDT BusinessDocumentMessageHeader 37830. There is one 37828 MessageHeader entity 37826 for each PurchaseOrderInformationMessage entity 37818. The MessageHeader entity 37826 also includes an ID 37832, a ReferenceID 37838, a CreationDateTime 37844, a SenderParty entity 37850, and a RecipientParty entity 37892 at the third level 37806.

The ID 37832 is of type GDT BusinessDocumentMessageID 37836, and there is one 37834 ID 37832 for each MessageHeader entity 37826. The ReferenceID 37838 is of type GDT BusinessDocumentMessageID 37842, and there is zero or one 37840 ReferenceID 37838 for each MessageHeader entity 37826. The CreationDateTime 37844 is of type GDT DateTime 37848, and there is one 37846 CreationDateTime entity 37844 for each MessageHeader entity 37826. The SenderParty entity 37850 is of type GDT BusinessDocumentMessageParty 37854, and there is zero or one 37852 SenderParty entity 37850 for each MessageHeader entity 37826. The RecipientParty entity 37892 is of type GDT BusinessDocumentMessageParty 37896, and there is any number 37894 of RecipientParty entities 37892 for each MessageHeader entity 37826.

The SenderParty entity 37850 includes an InternalID 37856, a StandardID 37862, and a ContactPerson 37868 at the fourth level 37808. The InternalID 37856 is of type GDT PartyInternalID 37860, and there is zero or one 37858 InternalID 37856 for each SenderParty entity 37850. The StandardID 37862 is of type GDT PartyStandardID 37866, and there is any number 37864 of StandardID 37862 for each SenderParty entity 37850. The ContactPerson 37868 is of type GDT ContactPerson 37872, and there is zero or one 37870 ContactPerson 37868 for each SenderParty entity 37850.

The ContactPerson 37868 includes a BuyerID 37874, a SellerID 37880, and an Address 37886 at the fifth level 37810. The BuyerID 37874 is of type GDT ContactPersonPartyID 37878, and there is zero or one 37876 BuyerID 37874 for each ContactPerson 37868. The SellerID 37880 is of type GDT ContactPersonPartyID 37884, and there is zero or one 37882 SellerID 37880 for each ContactPerson 37868. The Address 37886 is of type GDT Address 37890, and there is zero or one 37888 Address 37886 for each ContactPerson 37868.

The PurchaseOrderInformation package 37824 includes a Party package 37828A, a Location package 37830A, a DeliveryInformation package 37832A, a PaymentInformation package 37834A, an Attachment package 37836A, a Description package 37838A, a FollowUpMessage 37840A, and an Item package 37842A. The PurchaseOrderInformation package 37824 also includes a PurchaseOrderInformation entity 37898. PurchaseOrderInformation entity 37898 is of type GDT PurchaseOrderInformation 37802A, and there is one 37800A PurchaseOrderInformation entity 37898 for each PurchaseOrderInformationMessage entity 37818.

PurchaseOrderInformation entity 37898 includes an ID 37804A, a PostingDateTime 37810A, a LastChangeDateTime 37816A and a note 37822A at the third level 37806. ID 37804A is of type GDT BusinessTransactionDocumentID 37808A, and there is one 37806A ID 37804A for each PurchaseOrderInformation entity 37898. PostingDateTime 37810A is of type GDT DateTime 37814A, and there is zero or one 37812A PostingDateTime 37810A for each PurchaseOrderInformation entity 37898. LastChangeDateTime 37816A is of type GDT DateTime 37820A, and there is zero or one 37818A LastChangeDateTime 37816A for each PurchaseOrderInformation entity 37898. Note 37822A is of type GDT Note 37826A, and there is zero or one 37824A Note 37822A for each PurchaseOrderInformation entity 37898.

The Party package 37828A includes a BuyerParty entity 37844A, a SellerParty entity 37898A, a ProductRecipientParty entity 37804B, a VenderParty entity 37810B, a ManufacturerParty entity 37816B, a BillToParty entity 37822B, a PayerParty entity 37828B, and a CarrierParty entity 37834B at the third level 37806. The BuyerParty entity 37844A is of type GDT BusinessTransactionDocumentParty 37848A, and there is zero or one 37846A BuyerParty entity 37844A for each PurchaseOrderInformation entity 37898.

The SellerParty entity 37898A is of type GDT BusinessTransactionDocumentParty 37802B, and there is one 37800B SellerParty entity 37898A for each PurchaseOrderInformation entity 37898. The ProductRecipientParty entity 37804B is of type GDT BusinessTransactionDocumentParty 37808B, and there is zero or one 37806B ProductRecipientParty entity 37804B for each PurchaseOrderInformation entity 37898. The VendorParty entity 37810B is of type GDT BusinessTransactionDocumentParty 37814B, and there is zero or one 37812B VendorParty 37810B for each PurchaseOrderInformation entity 37898. The ManufacturerParty entity 37816B is of type GDT BusinessTransactionDocumentParty 37820B, and there is zero or one 37818B ManufacturerParty entity 37816B for each PurchaseOrderInformation entity 37898. The BillToParty entity 37822B is of type GDT BusinessTransactionDocumentParty 37826B, and there is zero or one 37824B BillToParty entity 37822B for each PurchaseOrderInfornation entity 37898. The PayerParty entity 37828B is of type GDT BusinessTransactionDocumentParty 37832B, and there is zero or one 37830B PayerParty entity 37828B for each PurchaseOrderInformation entity 37898. The CarrierParty entity 37834B is of type GDT BusinessTransactionDocumentParty 37838B, and there is zero or one 37836B CarrierParty entity 37834B for each PurchaseOrderInformation entity 37898.

The BuyerParty entity 37844A includes a StandardID 37850A; a BuyerID 37856A; a SellerID 37862A; an Address 37868A; and a ContactPerson 37874A. The StandardID 37850A is of type GDT PartyStandardID 37854A, and there is any number 37852A of StandardID 37850A for each BuyerParty entity 37844A. The BuyerID 37856A is of type GDT PartyPartyID 37860A, and there is zero or one 37858A BuyerID 37856A for each BuyerParty entity 37844A. The SellerID 37862A is of type GDT PartyPartyID 37866A, and there is zero or one 37864A SellerID 37862A for each BuyerParty entity 37844A. The Address 37868A is of type GDT Address 37872A, and there is zero or one 37870A Address 37868A for each BuyerParty entity 37844A. The ContactPerson 37874A is of type GDT ContactPerson 37878A, and there is zero or one 37876A ContactPerson 37874A for each BuyerParty entity 37844A.

ContactPerson 37874A includes a BuyerID 37880A; a SellerID 37886A; and an Address 37892A. The BuyerID 37880A is of type GDT ContactPersonPartyID 37884A, and there is zero or one 37882A BuyerID 37880A for each ContactPerson 37874A. SellerID 37886A is of type GDT ContactPersonPartyID 37890A, and there is zero or one 37888A SellerID 37886A for each ContactPerson 37874A. The Address 37892A is of type GDT Address 37896A, and there is zero or one 37894A Address 37892A for each ContactPerson 37874A.

Location package 37830A includes a ShipToLocation entity 37840B and a ShipFromLocation entity 37870B. The ShipToLocation entity 37840B is of type GDT BusinessTransactionDocumentLocation 37844B, and there is zero or one 37842B ShipToLocation entity 37840B for each PurchaseOrderInformation entity 37898. The ShipFromLocation entity 37870B is of type GDT BusinessTransactionDocumentLocation 37874B, and there is zero or one 37872B ShipFromLocation entity 37870B for each PurchaseOrderInformation entity 37898.

The ShipToLocation entity 37840B includes a StandardID 37846B, a BuyerID 37852B, a SellerID 37858, and an Address 37864B at the fourth level 37808. The StandardID 37846B is of type GDT LocationStandardID 37850B, and there is any number 37848B of StandardID 37846B for each ShipToLocation entity 37840B. The BuyerID 37852B is of type GDT LocationPartyID 37856B, and there is zero or one 37854B BuyerID 37852B for each ShipToLocation entity 37840B. The SellerID 37858 is of type GDT LocationPartyID 37862B, and there is zero or one 37860B SellerID 37858 for each ShipToLocation entity 37840B. The Address 37864A is of type GDT Address 37868B, and there is zero or one 37866B Address 37864A for each ShipToLocation entity 37840B.

The DeliveryInformation package 37832A includes a DeliveryTerms entity 37837676B at the third level 37806. DeliveryTerms entity 37876B is of type GDT DeliveryTerms 37880B, and there is zero or one 37878B DeliveryTerms entity 37876B for each PurchaseOrderInformation entity 37898.

DeliveryTerms entity 37876B includes a DeliveryItemGroupID 37882B, a DeliveryPriorityCode 37888B, an Incoterms 37894B, a PartialDelivery 37800C, a QuantityTolerance 37806C, a Transport 37812C, and a Description 37834C at the fourth level 37808. The DeliveryItemGroupID 37882B is of type GDT BusinessTransactionDocumentItemGroupID 37886B, and there is zero or one 37884B DeliveryItemGroupID 37882B for each DeliveryTerms entity 37876B. The DeliveryPriorityCode 37888B is of type GDT BusinessTransactionPriorityCode 37892B, and there is zero or one 37890B DeliveryPriorityCode 37888B for each DeliveryTerms entity 37876B. The Incoterms 37894B is of type GDT Incoterms 37898B, and there is zero or one 37896B Incoterms 37894B for each DeliveryTerms entity 37876B. The PartialDelivery 37800C is of type GDT PartialDelivery 37804C, and there is zero or one 37802C PartialDelivery 37800C for each DeliveryTerms entity 37876B. The QuantityTolerance 37806C is of type GDT QualityTolerance 37810C, and there is zero or one 37808C QuantityTolerance 37806C for each DeliveryTerms entity 37876B. There is zero or one 37814C Transport 37812C for each DeliveryTerms entity 37876B. The Description 37834C is of type GDT Description 37838C, and there is zero or one 37836C Description 37834C for each DeliveryTerms entity 37876B.

Transport 37812C includes a ServiceLevelCode 37816C, a ModeCode 37822C, and a MeansDescriptionCode 37828C at the fifth level 37810. The ServiceLevelCode 37816C is of type GDT TransportServiceLevelCode 37820C, and there is zero or one 37818C ServiceLevelCode 37816C for each Transport 37812C. The ModeCode 37822C is of type GDT TransportModeCode 37826C, and there is zero or one 37824C ModeCode 37822C for each Transport 37812C. The MeansDescriptionCode 37828C is of type GDT TransportMeansDescriptionCode 37832C, and there is zero or one 37830C MeansDescriptionCode 37828C for each Transport 37812C.

The PaymentInformation package 37834A includes a CashDiscountTerms entity 37840C and a PaymentForm entity 37868C at the third level 37806. CashDiscountTerms entity 37840C is of type GDT CashDiscountTerms 37844C, and there is zero or one 37842C CashDiscountTerms entity 37840C for each PurchaseOrderInformation entity 37898. There is zero or one 37870C PaymentForm entity 37868C for each PurchaseOrderInformation entity 37898.

CashDiscountTerms entity 37840C includes a PaymentBaselineDate 37846C, a MaximumCashDiscount 37852C, a NormalCashDiscount 37858C, and a FullPaymentDueDaysValue 37864C. The PaymentBaselineDate 37846C is of type GDT Date 37850C, and there is zero or one 37848C PaymentBaselineDate 37846C for each CashDiscountTerms entity 37840C. The MaximumCashDiscount 37852C is of type GDT CashDiscount 37856C, and there is zero or one 37854C MaximumCashDiscount 37852C for each CashDiscountTerms entity 37840C. The NormalCashDiscount 37858C is of type GDT CashDiscount 37862C, and there is zero or one 37860C NormalCashDiscount 37858C for each CashDiscountTerms entity 37840C. There is zero or one 37866C FullPaymentDueDaysValue 37864C for each CashDiscountTerms entity 37840C.

PaymentForm entity 37868C includes a Code 37872C and a PaymentCard 37878C at the fourth level 37808. The Code 37872C is of type GDT PaymentFormCode 37876C, and there is one 37874C Code 37872C for each PaymentForm entity 37868C. The PaymentCard 37878C is of type GDT PaymentCard 37882C, and there is zero or one 37880C PaymentCard 37878C for each PaymentForm entity 37868C.

The Attachment package 37836A includes an AttachmentWebAddress entity 37884C and an InternalAttachmentWebAddress entity 37890C at the third level 37806. The AttachmentWebAddress entity 37884C is of type GDT WebAddress 37888C, and there is any number 37886C of AttachmentWebAddress entities 37884C for each PurchaseOrderInformation entity 37898. The InternalAttachmentWebAddress entity 37890C is of type GDT WebAddress 37894C, and there is any number 37892C of InternalAttachmentWebAddress entities 37890C for each PurchaseOrderInformation entity 37898.

The Description package 37838A includes a Description entity 37896C and an InternalDescription entity 37802D at the third level 37806. The Description entity 37896C is of type GDT Description 37800D, and there is zero or one 37898C Description entity 37896C for each PurchaseOrderInformation entity 37898. The InternalDescription entity 37802D is of type GDT Description 37806D, and there is zero or one 37804D InternalDescription entity 37802D for each PurchaseOrderInformation entity 37898.

The FollowUpMessage package 37840A includes a FollowUpPurchaseOrderConfirmation entity 37808D, a FollowUpDespatchedDeliveryNotification entity 37818D, a FollowUpServiceAcknowledgementRequest entity 37828D, and a FollowUpInvoiceRequest entity 37838D at the third level 37806. There is zero or one 37810D FollowUpPurchaseOrderConfirmation entity 37808D for each PurchaseOrderInformation entity 37898. FollowUpPurchaseOrderConfirmation entity 37808D includes a RequirementCode 37812D at the fourth level 37808. The RequirementCode 37812D is of type GDT FollowUpMessageRequirementCode 37816D, and there is one 37814D RequirementCode 37812D for each FollowUpPurchaseOrderConfirmation entity 37808D.

There is zero or one 37820D FollowUpDespatchedDeliveryNotification entity 37818D for each PurchaseOrderInformation entity 37898. FollowUpDespatchedDeliveryNotification entity 37818D includes a RequirementCode 37822D at the fourth level 37808. The RequirementCode 37822D is of type GDT FollowUpMessageRequirementCode 37826D, and there is one 37824D RequirementCode 37822D for each FollowUpDespatchedDeliveryNotification entity 37818D.

There is zero or one 37830D FollowUpServiceAcknowledgementRequest entity 37828D for each PurchaseOrderInformation entity 37898. FollowUpServiceAcknowledgementRequest entity 37828D includes a RequirementCode 37832D at the fourth level 37808. The RequirementCode 37832D is of type GDT FollowUpMessageRequirementCode 37836D, and there is one 37834D RequirementCode 37832D for each FollowUpServiceAcknowledgementRequest entity 37828D.

There is zero or one 37840D FollowUpInvoiceRequest entity 37838D for each PurchaseOrderInformation entity 37898. FollowUpInvoiceRequest entity 37838D includes a RequirementCode 37842D and an EvaluatedReceiptSettlementIndicator 37848D at the fourth level 37808. The RequirementCode 37842D is of type GDT FollowUpMessageRequirementCode 37846D, and there is one 37844D RequirementCode 37842D for each FollowUpServiceAcknowledgementRequest entity 37838D. The EvaluatedReceiptSettlementIndicator 37848D is of type GDT EvaluatedReceiptSettlementIndicator 37852D, and there is zero or one 37850D EvaluatedReceiptSettlementIndicator 37848D for each FollowUpServiceAcknowledgementRequest entity 37838D.

The Item package 37842A includes an Item entity 37854D at the third level 37806, and includes the following packages: a ProductInformation package 37888D; a PriceInformation package 37890D; a Party package 37892D; a Location package 37894D; a DeliveryInformation Package 37896D; a BusinessTransactionDocumentReference package 37898D; an Attachment package 37800E; a Description package 37802E; and a ScheduleLine package 37804E.

The Item entity 37854D is of type GDT PurchaseOrderInformationItem 37858D, and there is at least one 37856D Item entity 37854D for each PurchaseOrderInformation entity 37898. The Item entity 37854D includes an ID 37860D, a ConfirmedInformationOutdatedIndicator 37866D, and a HierarchyRelationship 37872D at the fourth level 37808. The ID 37860D is of type GDT BusinessTransactionDocumentItemID 37864D, and there is one 37862D ID 37860D for each Item entity 37854D. The ConfirmedInformationOutdatedIndicator 37866D is of type GDT InformationOutdatedIndicator 37870D, and there is zero or one 37868D ConfirmedInformationOutdatedIndicator 37866D for each Item entity 37854D. There is zero or one 37874D HierarchyRelationship 37872D for each Item entity 37854D.

The HierarchyRelationship 37872D includes a ParentItemID 37876D and a TypeCode 37882D at the fifth level 37810. The ParentItemID 37876D is of type GDT BusinessTransactionDocumentItemID 37880D, and there is one 37878D ParentItemID 37876D for each HierarchyRelationship 37872D. The TypeCode 37882D is of type GDT BusinessTransactionDocumentItemHierarchyRelationshipTypeCode 37886D, and there is one 37884D TypeCode 37882D for each HierarchyRelationship 37872D.

The ProductInformation package 37888D includes a Product entity 37806E and a ProductCategory entity 37848E at the fourth level 37808. The Product entity 37806E is of type GDT BusinessTransactionDocumentProduct 37810E, and there is zero or one 37808E Product entity 37806E for each Item entity 37854D. The ProductCategory entity 37848E is of type GDT BusinessTransactionDocumentProductCategory 37852E, and there is zero or one 37850E ProductCategory entity 37848E for each Item entity 37854D.

The Product entity 37806E includes a StandardID 37812E, a BuyerID 37818E, a SellerID 37824E, a ManufacturerID 37830E, a TypeCode 37836E, and a Note 37842E at the fifth level 37810. The StandardID 37812E is of type GDT ProductStandardID 37816E, and there is any number 37814E of StandardID 37812E for each Product entity 37806E. The BuyerID 37818E is of type GDT ProductPartyID 37822E, and there is zero or one 37820E BuyerID 37818E for each Product entity 37806E. The SellerID 37824E is of type GDT ProductPartyID 37828E, and there is zero or one 37826E SellerID 37824E for each Product entity 37806E. The ManufacturerID 37830E is of type GDT ProductPartyID 37834E, and there is zero or one 37832E ManufacturerID 37830E for each Product entity 37806E. The TypeCode 37836E is of type GDT ProductTypeCode 37840E, and there is zero or one 37838E TypeCode 37836E for each Product entity 37806E. The Note 37842E is of type GDT Note 37846E, and there is zero or one 37844E Note 37842E for each Product entity 37806E.

The ProductCategory entity 37848E includes a StandardID 37854E, a BuyerID 37860E, and a SellerID 37866E at the fifth level 37810. The StandardID 37854E is of type GDT ProductCategoryStandardID 37858E, and there is any number 37856E of StandardID 37854E for each ProductCategory entity 37848E. The BuyerID 37860E is of type GDT ProductCategoryPartyID 37864E, and there is zero or one 37862E BuyerID 37860E for each ProductCategory entity 37848E. The SellerID 37866E is of type GDT ProductCategoryPartyID 37870E, and there is zero or one 37868E SellerID 37866E for each ProductCategory entity 37848E.

The PriceInformation package 37890D includes a Price entity 37872E, a ConfirmedPrice entity 37882E, and a ProcurementCostUpperLimit 37892E at the fourth level 37808. There is zero or one 37874E Price entity 37872E for each Item entity 37854D. There is zero or one 37884E ConfirmedPrice entity 37882E for each Item entity 37854D. The ProcurementCostUpperLimit 37892E is of type GDT ProcurementCostUpperLimit 37896E, and there is zero or one 37894E ProcurementCostUpperLimit 37892E for each Item entity 37854D.

The Price entity 37872E includes a NetUnitPrice 37876E at the fifth level 37810. The NetUnitPrice 37876E is of type GDT Price 37880E, and there is zero or one 37878E NetUnitPrice 37876E for each Price entity 37872E.

The ConfirmedPrice entity 37882E includes a NetUnitPrice 37886E at the fifth level 37810. The NetUnitPrice 37886E is of type GDT Price 37890E, and there is zero or one 37888E NetUnitPrice 37886E for each ConfirmedPrice entity 37882E.

The Party package 37892D includes a BuyerParty entity 37898E, a SellerParty entity 37804F, a ProductRecipientParty entity 37810F, a VenderParty entity 37816F, a ManufacturerParty entity 37822F, a BillToParty entity 37828F, a PayerParty entity 37834F, and a Carrier Party entity 37840F at the fourth level 37808. The BuyerParty entity 37898E is of type GDT BusinessTransactionDocumentParty 37802F, and there is zero or one 37800F BuyerParty entities 37898E for each Item entity 37854D. The SellerParty entity 37804F is of type GDT BusinessTransactionDocumentParty 37808F, and there is zero or one 37806F SellerParty entity 37804F for each Item entity 37854D. The ProductRecipientParty entity 37810F is of type GDT BusinessTransactionDocumentParty 37814F, and there is zero or one 37812F ProductRecipientParty entity 37810F for each Item entity 37854D. The VendorParty entity 37816F is of type GDT BusinessTransactionDocumentParty 37820F, and there is zero or one 37818F VendorParty entity 37816F for each Item entity 37854D. The ManufacturerParty entity 37822F is of type GDT BusinessTransactionDocumentParty 37826F, and there is zero or one 37824F ManufacturerParty entity 37822F for each Item entity 37854D. The BillToParty entity 37828F is of type GDT BusinessTransactionDocumentParty 37832F, and there is zero or one 37830F BillToParty entity 37828F for each Item entity 37854D. The PayerParty entity 37834F is of type GDT BusinessTransactionDocumentParty 37838F, and there is zero or one 37836F PayerParty entity 37834F for each Item entity 37854D. The CarrierParty entity 37840F is of type GDT BusinessTransactionDocumentParty 37844F, and there is zero or one 37842F CarrierParty entity 37840F for each Item entity 37854D.

The Location package 37894D includes a ShipToLocation entity 37846F and a ShipFromLocation entity 37852F at the fourth level 37808. The ShipToLocation entity 37846F is of type GDT BusinessTransactionDocumentLocation 37850F, and there is zero or one 37848F ShipToLocation entity 37846F for each Item entity 37854D. The ShipFromLocation entity 37852F is of type GDT BusinessTransactionDocumentLocation 37856F, and there is zero or one 37854F ShipFromLocation entity 37852F for each Item entity 37854D.

The DeliveryInformation package 37896D includes a DeliveryTerms entity 37858F at the fourth level 37808. The DeliveryTerms entity 37858F is of type GDT DeliveryTerms 37862F, and there is zero or one 37860F DeliveryTerms entity 37858F for each Item entity 37854D.

The BusinessTransactionDocumentReference package 37898D includes a QuoteReference entity 37864F, a PurchaseContractReference entity 37882F, an OriginPurchaseOrderReference entity 37800G, a BuyerProductCatalogReference entity 37818G, and a SellerProductCatalogReference entity 37836G at the fourth level 37808.

The QuoteReference entity 37864F is of type GDT BusinessTransactionDocumentReference 37868F, and there is zero or one 37866F QuoteReference entity 37864F for each Item entity 37854D. The QuoteReference entity 37864F includes an ID 37870F and a ItemID 37876F at the fifth level 37810. The ID 37870F is of type GDT BusinessTransactionDocumentID 37874F, and there is one 37872F ID 37870F for each QuoteReference entity 37864F. The ItemID 37876F is of type GDT BusinessTransactionDocumentItemID 37880F, and there are any number 37878F of ItemID 37876F for each QuoteReference entity 37864F.

The PurchaseContractReference entity 37882F is of type GDT BusinessTransactionDocumentReference 37886F, and there is any number 37884F of PurchaseContractReference entities 37882F for each Item entity 37854D. The PurchaseContractReference entity 37882F includes an ID 37888F and a ItemID 37894F at the fifth level 37810. The ID 37888F is of type GDT BusinessTransactionDocumentID 37892F, and there is one 37890F ID 37888F for each PurchaseContractReference entity 37882F. The ItemID 37894F is of type GDT BusinessTransactionDocumentItemID 37898F, and there are any number 37896F of ItemID 37894F for each PurchaseContractReference entity 37882F.

The OriginPurchaseOrderReference entity 37800G is of type GDT BusinessTransactionDocumentReference 37804G, and there is zero or one 37802G OriginPurchaseOrderReference entity 37800G for each Item entity 37854D. The OriginPurchaseOrderReference entity 37800G includes an ID 37806G and a ItemID 37812G at the fifth level 37810. The ID 37806G is of type GDT BusinessTransactionDocumentID 37810G, and there is one 37808G ID 37806G for each OriginPurchaseOrderReference entity 37800G. The ItemID 37812G is of type GDT BusinessTransactionDocumentItemID 37816G, and there are any number 37814G of ItemID 37812G for each OriginPurchaseOrderReference entity 37800G.

The BuyerProductCatalogReference entity 37818G is of type GDT CatalogReference 37822G, and there is zero or one 37820G BuyerProductCatalogReference entity 37818G for each Item entity 37854D. The BuyerProductCatalogReference entity 37818G includes an ID 37824G and a ItemID 37830G at the fifth level 37810. The ID 37824G is of type GDT CatalogID 37828G, and there is one 37826G ID 37824G for each BuyerProductCatalogReference entity 37818G. The ItemID 37830G is of type GDT CatalogItemID 37834G, and there are any number 37832G of ItemID 37830G for each BuyerProductCatalogReference entity 37818G.

The SellerProductCatalogReference entity 37836G is of type GDT CatalogReference 37840G, and there is zero or one 37838G SellerProductCatalogReference entity 37836G for each Item entity 37854D. The SellerProductCatalogReference entity 37836G includes an ID 37842G and a ItemID 37848G at the fifth level 37810. The ID 37842G is of type GDT CatalogID 37846G, and there is one 37844G ID 37842G for each SellerProductCatalogReference entity 37836G. The ItemID 37848G is of type GDT CatalogItemID 37852G, and there are any number 37850G of ItemID 37848G for each SellerProductCatalogReference entity 37836G.

The Attachment package 37800E includes an AttachmentWebAddress entity 37854G and an InternalAttachmentWebAddress entity 37860G at the fourth level 37808. The AttachmentWebAddress entity 37854G is of type GDT WebAddress 37858G, and there is any number 37856G of AttachmentWebAddress entities 37854G for each Item entity 37854D. The InternalAttachmentWebAddress entity 37860G is of type GDT WebAddress 37864G, and there is any number 37862G of InternalAttachmentWebAddress entities 37860G for each Item entity 37854D.

The Description package 37802E includes a Description entity 37866G and an InternalDescription entity 37872G at the fourth level 37808. The Description entity 37866G is of type GDT Description 37870G, and there is zero or one 37868G Description entity 37866G for each Item entity 37854D. The InternalDescription entity 37872G is of type GDT Description 37876G, and there is zero or one 37874G InternalDescription entity 37872G for each Item entity 37854D.

The ScheduleLine package 37804E includes a ScheduleLine entity 37878G and a ConfirmedScheduleLine entity 37802H at the fourth level 37808. The ScheduleLine entity 37878G is of type GDT PurchaseOrderInformationItemScheduleLine 37882G, and there is any number 37880G of ScheduleLine entities 37878G for each Item entity 37854D. The ConfirmedScheduleLine entity 37802H is of type GDT PurchaseOrderInformationItemScheduleLine 37806H, and there is any number 37804H of ConfirmedScheduleLine entities 37802H for each Item entity 37854D.

The ScheduleLine entity 37878G includes an ID 37884G, a DeliveryPeriod 37890G, and a Quantity 37896G at the fifth level 37810. The ID 37884G is of type GDT BusinessTransactionDocumentItemScheduleLineID 37888G, and there is zero or one 37886G ID 37884G for each ScheduleLine entity 37878G. The DeliveryPeriod 37890G is of type GDT TimeDatePeriod 37894G, and there is one 37892G DeliveryPeriod 37890G for each ScheduleLine entity 37878G. The Quantity 37896G is of type GDT Quantity 37800H, and there is any number 37898G of Quantity 37896G for each ScheduleLine entity 37878G.

h) Tax Due Notification Interface

A TaxDueNotification interface is an interface that is used to transfer information about the tax that is due in a company to a tax register. The tax register collects the company's receivables and payables vis-à-vis the tax authorities (tax offices) responsible. Tax is declared and the process of paying taxes triggered from the tax register in accordance with legal time limits and requirements.

In the business scenarios SFS (Sale From Stock) and PTS (Procure To Stock), goods are sold to customers and goods are bought from suppliers. Depending on the country concerned, the outgoing invoices sent and incoming invoices received during this process identify the sales tax or similar tax that is transferred to the tax register. From a tax perspective, credit memos are handled in the same way as invoices. Legal requirements may also stipulate how a discount taken by the payer is treated for tax purposes. In accordance with methods and systems consistent with the present invention, a correction for the outgoing or incoming payment may be transferred to the tax register.

(1) Message Type Tax Due Notification

Both the TaxDueNotification message and the TaxDueCancellationRequest are implemented or instantiated based on the message data type TaxDueMessage.

(2) Message Choreography

FIG. 377 depicts the message choreography for a TaxDueNotification interface. The choreography involves two business entities: a tax determination or calculation entity 37702 and a tax register entity 37704. The tax calculations entity 37702 and the tax register entity 37704 each may be a department of a company, a separate business entity engaged by the company, or tax authorities (tax offices) that determine and calculate a company's taxes.

In the implementation shown in FIG. 377, the tax calculation entity 37702 sends a "TaxDueNotification" message 37706 to the tax register entity 37704 to transfer the data relevant for tax reports and tax payments to the tax register 37704 of the company. The tax calculation entity 37702 may also send a "TaxDueCancellationRequest" message 37708 to the tax register entity 37704 to transfer cancellations of invoices, credit memos, and payments previously sent to the tax register 37704 as part of a TaxDueNotification message 37706.

(3) Message Data Type Tax Due Message

The data model for the message data type TaxDueMessage used to implement a TaxDueNotification message 37706 and a TaxDueCancellationRequest message 37708 is depicted in FIG. 378. The message data type TaxDueMessage includes a TaxDueMessage package 37800. The TaxDueMessage package 37800 includes a MessageHeader package 37802, a TaxDue package 37804, and a TaxDueMessage object or entity 37806, which may be included in the business document and the business information that is relevant for sending a business document in a message.

(a) Message Header Package

A MessageHeader package 37802 groups the business information that is relevant for sending a business document in a message. The MessageHeader package 37802 is not required to implement the TaxDueNotification message 37706. In one implementation, an invoice or credit memo may be transferred via a TaxDueNotification message 37706 to the tax register 37704 once. In this implementation, a message ID in a Message Header is not required, since the reference can be established with the ID of the invoice or credit memo. In this implementation, the sender is known by the "System ID." Without a ReferenceID in the Message Header, the recipient of the TaxDueNotification message may not be identified within the associated Message Header. However, Invoice and Billing entities (e.g., Tax Calculation entities 37702) recognize that this message is to be sent to the Tax Register 37704.

(b) Tax Due Package

The TaxDue package 37804 includes the summary of the information from a business document that is required for reporting or paying tax due to the tax authorities. The TaxDue package 37804 includes a Party Package 37808, a Tax Package 37810, an Item Package 37812, and a TaxDue entity 37814. There is a 1:1 relationship 37816 between the TaxDueMessage entity 37806 and the TaxDue entity 37814.

(i) Tax Due

The TaxDue is the information from a business document that is required to report or pay due tax to the tax authorities. The TaxDue entity 37814 includes information about the business partners subject to tax, the tax events based to which the business partners are subject to tax/tax exempt, and about the type and amount of tax due.

As further described below, the TaxDue entity 37814 includes a BaseBusinessTransactionDocumentID, a BaseBusinessTransactionDocumentTypeCode, a BaseBusinessTransactionDocumentDate, and a ProductTaxEventTypeCode. The BaseBusinessTransactionDocumentID is the identifier for the base business document for the tax due date. The BaseBusinessTransactionDocumentID also may be used for auditing purposes, and is of type GDT:BusinessTransactionDocumentID. Thee BaseBusinessTransactionDocumentTypeCode identifies the type of base business document for the tax due date. Examples of such types of base business documents include incoming and outgoing invoices, incoming and outgoing credit memos, incoming and outgoing payments, and cancellations of the types specified. The BaseBusinessTransactionDocumentTypeCode is of type GDT: BusinessTransactionDocumentTypeCode. The BaseBusinessTransactionDocumentDate identifies the date of the base business document for the tax due date. The BaseBusinessTransactionDocumentDate depends on the type of business document. For example, if the business document is an incoming invoice or an outgoing invoice, the BaseBusinessTransactionDocumentDate is the invoice date. If the business document is an incoming credit memo or an outgoing credit memo, the BaseBusinessTransactionDocumentDate is the credit memo date. If the business document is an Incoming payment, the BaseBusinessTransactionDocumentDate is the date of the incoming payment. Finally, if the business document is an outgoing payment, the BaseBusinessTransactionDocumentDate is date of the outgoing payment. The BaseBusinessTransactionDocumentDate is of type GDT:Date. The ProductTaxEventTypeCode identifies the type of tax event that characterizes the circumstances of the purchase, sale, or consumption of a product. The ProductTaxEventTypeCode is based on country-specific tax laws, such as the German turnover tax law (UStG), and is of type GDT: ProductTaxEventTypeCode.

(ii) Party Package

The Party Package 37808 groups together the business partners that are subject to a tax or tax exemption because of their function in the tax event. The Party Package 37808 includes a BuyerParty entity 37818, a SellerParty entity 37820, a ProductRecipientParty entity 37822, a VendorParty entity 37824, a DebitorParty entity 37820, and a CreditorParty entity 37828. The partners that represent the service provider and the service recipient from a tax point of view may be specified. In an invoice, the SellerParty typically identifies the service provider and the BuyerParty typically identifies the service recipient. In a payment, the CreditorParty typically identifies the service provider, and the DebitorParty typically identifies the service recipient. The attributes required for a tax report may be derived from the information about the business partners included in the Party Package 37808. These attributes are the VAT registration numbers and similar tax-relevant identification numbers for the business partners.

(a) Buyer Party

The BuyerParty identifies a company or a person that purchases goods or services. The BuyerParty entity 37818 is of type GDT:BusinessTransactionDocumentParty. There is a 1:c relationship 37830 between the TaxDue entity 37814 and the BuyerParty entity 37818. If a BuyerParty entity 37818 is not specified in an invoice, the ProductRecipientParty entity 37822 may be considered to be the service recipient from a tax point of view and may therefore be specified.

(b) Seller Party

The SellerParty identifies a company or a person that sells goods or services. The SellerParty entity 37820 is of type GDT:BusinessTransactionDocumentParty. There is a 1:c relationship 37832 between the TaxDue entity 37814 and the SellerParty entity 37820. If a SellerParty entity 37820 is not specified in an invoice, the VendorParty entity 37824 may be considered to be the service provider from a tax point of view and may therefore be specified.

(c) Product Recipient Party

The ProductRecipientParty identifies a company or a person to whom goods are delivered or for whom services are provided. The ProductRecipientParty entity 37822 is of type GDT:BusinessTransactionDocumentParty. There is a 1:c relationship 37834 between the TaxDue entity 37814 and the ProductRecipientParty entity 37822.

(d) Vendor Party

The VendorParty identifies a company or a person that delivers goods or provides services. The VendorParty entity 37824 is of type GDT:BusinessTransactionDocumentParty. There is a 1:c relationship 37836 between the TaxDue entity 37814 and the VendorParty entity 37824.

(e) Debitor Party

The DebitorParty identifies a company or a person who owes money for goods or services provided. The DebitorParty entity 37826 is of type GDT:BusinessTransactionDocumentParty. There is a 1:c relationship 37838 between the TaxDue entity 37814 and the DebitorParty entity 37826. In a payment, the DebitorParty entity 37826 may be considered to be the service recipient from a tax point of view and may therefore be specified.

(f) Creditor Party

The CreditorParty entity 37828 is a company or a person to whom money is owing for goods or services provided. The CreditorParty entity 37828 is of type GDT:BusinessTransactionDocumentParty. There is a 1:c relationship 37840 between the TaxDue entity 37814 and the CreditorParty entity 37828. In a payment, the CreditorParty entity 37828 may be considered to be the service provider from a tax point of view and may therefore be specified.

(iii) Tax Package

The Tax Package 37810 includes a summary of the information about types and totals amounts of the tax in the base business document for the tax due. The Tax Package 37810 includes a ProductTax entity 37842. The ProductTax entity 37842 is of type GDT:ProductTax. There is a 1:cn relationship 37844 between the TaxDue entity 37814 and the ProductTax entity 37842.

The ProductTax includes a description of the tax that is incurred when products are purchased, sold, and consumed. If a ProductTax entity 37842 is specified, the ProductTax entity 37842 represents totals of the tax base amount and the tax amount, which are shown for specific countries for each tax type and tax rate. If total amounts are required by law, they are specified at the TaxDue entity 37814 level. Otherwise, the information about the tax due at the item entity level described below is sufficient. The specified country (CountryCode) and jurisdiction code (JurisdictionCode) (usually required for the United States, Canada, and Brazil) also may apply at the item level of the TaxDueNotification message. NonDeductibleAmount and NonDeductiblePercentage are filled if, in the case of incoming invoices and incoming credit memos, the entire tax amount cannot be claimed from the tax authorities (input tax deduction). This is relevant for particular countries and tax types (VAT—value added tax). TriangulationIndicator specifies whether intra-community triangulation exists, as described under §25b UStG (or under the relevant paragraphs for the other member states of the European Union).

In one implementation, the currency communicated in the ProductTax entity 37842 entity from the tax calculation entity to the tax register entity is the reporting currency. Thus, in this implementation, the tax calculation entity determines the reporting currency.

(iv) Tax Due Item Package

The TaxDueItem ("Item") package 37812 includes a summary of the information about tax due from the items in the base business document for the TaxDueNotification message. The Item package 37812 includes a TaxDueItemParty package 37846, a TaxDueItemTax package 37848, and a TaxDueItem entity 37850.

(a) Tax Due Item

The TaxDueItem identifies information from an item of a business document that is required to report or pay due tax to the tax authorities. The TaxDueItem entity 37850 includes information about the business partners subject to tax, the tax events based on which the business partners are subject to tax/tax exempt, and about the type and amount of tax due. There is a 1:cn relationship 37852 between the TaxDue entity 37814 and the TaxDueItem entity 37850.

The TaxDueItem entity 37850 includes a BaseBusinessTransactionDocumentItemID, a BaseBusinessTransactionDocumentItemTypeCode, a BaseBusinessTransactionDocumentItemDeliveryDate, and a ProductTaxEventTypeCode as described herein. The BaseBusinessTransactionDocumentItemID is the identifier for the item in the base business document for the specified item in the TaxDueNotification message, and is of type GDT:BusinessTransactionDocumentItemID. The BaseBusinessTransactionDocumentItemTypeCode identifies the type of item specified in the business document, and is of type GDT:BusinessTransactionDocumentItemTypeCode. The BaseBusinessTransactionDocumentItemDeliveryDate identifies the date on which the invoiced quantity of a product was delivered, according to the item in the base business document, and is of type GDT:Date.

When values are transferred at the item level in accordance with methods and systems consistent with the present invention, the tax register entity will then aggregate the data in line with legal requirements. Aggregated data may be transferred at the document level if permitted by legal requirements. The BaseBusinessTransactionDocumentItemTypeCode may be specified if it has a different type to that of the base business document, for example, when an invoice includes a credit memo item. In one implementation, the ItemDeliveryDate is filled when required by law, such as in Germany, where the date on which the taxes are due to be paid to the tax office is derived from the ItemDeliveryDate. In one implementation, the ProductTaxEventTypeCode is filled when the tax event at item level is not the "main" tax event specified above.

For each item in the base business document that is relevant for tax purposes, there are one or more TaxDueItem entities 37850. For example, there may be several items if several tax types are due or if taxes are due in several jurisdictions, as in the United States.

(b) Tax Due Item Party Package

Similar to the Party Package 37808, the TaxDueItemParty Package 37846 includes a BuyerParty entity 37854, a SellerParty entity 37856, a ProductRecipientParty entity 37858, a VendorParty entity 37860, a DebitorParty entity 37862, and a CreditorParty entity 37864. The TaxDueItemParty package 37846 groups together the business partners that differ from the business partners grouped together in the Party Package 37808.

(c) Buyer Party

The BuyerParty entity 37854 is of type GDT:BusinessTransactionDocumentParty. There is a 1:c relationship 37866 between the TaxDueItem entity 37850 and the BuyerParty entity 37854.

(d) Seller Party

The SellerParty entity 37856 is of type GDT:BusinessTransactionDocumentParty. There is a 1:c relationship 37868 between the TaxDueItem entity 37850 and the SellerParty entity 37856.

(e) Product Recipient Party

The ProductRecipientParty entity 37858 is of type GDT:BusinessTransactionDocumentParty. There is a 1:c relationship 37870 between the TaxDueItem entity 37850 and the ProductRecipientParty entity 37858.

(f) Vendor Party

The VendorParty entity 37860 is of type GDT:BusinessTransactionDocumentParty. There is a 1:c relationship 37872 between the TaxDueItem entity 37850 and the VendorParty entity 37860.

(g) Debitor Party

The DebitorParty entity 37862 is of type GDT:BusinessTransactionDocumentParty. There is a 1:c relationship 37874 between the TaxDueItem entity 37850 and the DebitorParty entity 37862

(h) Creditor Party

The CreditorParty entity 37864 is of type GDT:BusinessTransactionDocumentParty. There is a 1:c relationship 37876 between the TaxDueItem entity 37850 and the CreditorParty entity 37864.

(i) Tax Due Item Tax Package

Similar to the Tax Package 37810, the TaxDueItemTax Package 37848 includes a ProductTax entity 37878. The ProductTax entity 37878 is of type GDT:ProductTax. There is a 1:n relationship 37880 between the TaxDueItem entity 37850 and the ProductTax entity 37878.

(4) Message Data Type Element Structure

FIGS. 379A-D depict the element structure for a TaxDueNotification and a TaxDueCancellationRequest. The element structure is similar to the above described data model of the message data type TaxDueMessage as reflected in FIG. 378, but provides additional information regarding the details for interfacing with or implementing a TaxDueMessage, such as a TaxDueNotification. As shown in FIGS. 379A-D, the element structure identifies the different packages 37900 that may be in a respective TaxDueNotification and a TaxDueCancellationRequest. The element structure for the TaxDueNotification and a TaxDueCancellationRequest includes four levels 37902, 37904, 37906, and 37908, each of which is associated with a respective package 37900. The element structure identifies the cardinality or occurrence 37910 and the data type 37912 information for the elements at the respective levels 37902, 37904, 37906, and 37908 in the respective package 37900.

The outermost package of this interface is a TaxDueMessage package 37914, which includes a TaxDueMessage entity 37916 at the first level 37902. The TaxDueMessage entity 37916 is of type GDT:TaxDueMessage 37918.

The TaxDueMessage package 37914 also includes a TaxDue Package 37920. The TaxDue Package 37920 includes a TaxDue entity 37922. There is one 37924 TaxDue entity 37922 for each The TaxDueMessage entity 37916. The TaxDue entity 37922 is of type GDT:TaxDue 37926.

The TaxDue entity 37922 includes a BaseBusinessTransactionDocumentID 37928, a BaseBusinessTransactionDocumentTypeCode 37934, a BaseBusinessTransactionDocumentDate 37940, and a ProductTaxEventTypeCode 37946. The BaseBusinessTransactionDocumentID 37928 is of type GDT:BusinessTransactionDocumentID 37932. The BaseBusinessTransactionDocumentTypeCode 37934 is of type GDT:BusinessTransactionDocumentTypeCode 37938. The BaseBusinessTransactionDocumentDate 37940 is of type GDT:Date 37944. The ProductTaxEventTypeCode 37946 is of type GDT:ProductTaxEventTypeCode 37950. There is one 37930 BaseBusinessTransactionDocumentID 37928 for each TaxDue entity 37922. There is one 37936 BaseBusinessTransactionDocumentTypeCode 37934 for each TaxDue entity 37922. There is one 37942 BaseBusinessTransactionDocumentDate 37940 for each TaxDue entity 37922. There is zero or one 37948 ProductTaxEventTypeCode 37946 for each TaxDue entity 37922.

The TaxDue package 37920 also includes a Party package 37952, a Tax package 37954, and an Item package 37956.

The Party package 37952 includes a BuyerParty entity 37958, a SellerParty entity 37964, a ProductRecipientParty entity 37970, a VendorParty entity 37976, a DebitorParty entity 37982, and a CreditorParty entity 37988. The BuyerParty entity 37958 is of type GDT:BusinessTransactionDocumentParty 37962. There is one or zero 37960 BuyerParty entity 37958 for each TaxDue entity 37922. The SellerParty entity 37964 is of type GDT:BusinessTransactionDocumentParty 37968. There is one or zero 37966 SellerParty entity 37964 for each TaxDue entity 37922. The ProductRecipientParty entity 37970 is of type GDT:BusinessTransactionDocumentParty 37974. There is one or zero 37972 ProductRecipientParty entity 37970 for each TaxDue entity 37922. The VendorParty entity 37976 is of type GDT:BusinessTransactionDocumentParty 37980. There is one or zero 37978 VendorParty entity 37976 for each TaxDue entity 37922. The DebitorParty entity 37982 is of type GDT:BusinessTransactionDocumentParty 37986. There is one or zero 37984 DebitorParty entity 37982 for each TaxDue entity 37922. The CreditorParty entity 37988 is of type GDT:BusinessTransactionDocumentParty 37992. There is one or zero 37990 CreditorParty entity 37988 for each TaxDue entity 37922.

The Tax package 37954 includes a ProductTax entity 37994. The ProductTax entity 37994 is of type GDT:ProductTax 37998. There is one or more 37990 ProductTax entities 37994 for each TaxDue entity 37922.

The Item package 37956 includes an Item entity 37900A. The Item entity 37900A is of type GDT:TaxDueItem 37904A. There is one or more 37902A Item entities 37900A for each TaxDue entity 37922.

The Item entity 37900A includes a BaseBusinessTransactionDocumentItemID 37906A, a BaseBusinessTransactionDocumentItemTypeCode 37912A, a BaseBusinessTransactionDocumentDeliveryDate 37918A, and a ProductTaxEventTypeCode 37924A. The BaseBusinessTransactionDocumentItemID 37906A is of type GDT:BusinessTransactionDocumentItemID 37910A. The BaseBusinessTransactionDocumentItemTypeCode 37912A is of type GDT:BusinessTransactionDocumentItemTypeCode 37916A. The BaseBusinessTransactionDocumentDeliveryDate 37918A is of type GDT:Date 37922A. The ProductTaxEventTypeCode 37924A is of type GDT:ProductTaxEventTypeCode 37928A. There is one 37908A BaseBusinessTransactionDocumentItemID 37906A for each Item entity 37900A. There is one or zero 37914A BaseBusinessTransactionDocumentItemTypeCode 37912A for each Item entity 37900A. There is one or zero 37920A BaseBusinessTransactionDocumentDeliveryDate 37918A for each Item entity 37900A. There is zero or one 37926A ProductTaxEventTypeCode 37924A for each Item entity 37900A.

The Item package 37956 also includes a Party package 37930A (i.e., a TaxDueItemParty package) and a Tax package 37932A (e.g., a TaxDueItemParty package).

Similar to the Party package 37952 in the TaxDue package 37920, the TaxDueItemParty package 37930A includes a BuyerParty entity 37934A, a SellerParty entity 37940A, a ProductRecipientParty entity 37946A, a VendorParty entity 37952A, a DebitorParty entity 37958A, and a CreditorParty entity 37964A. The BuyerParty entity 37934A is of type GDT:BusinessTransactionDocumentParty 37938A. There is one or zero 37936A BuyerParty entity 37934A for each Item entity 37900A. The SellerParty entity 37940A is of type GDT:BusinessTransactionDocumentParty 37944A. There is one or zero 37942A SellerParty entity 37940A for each Item entity 37900A. The ProductRecipientParty entity 37946A is of type GDT:BusinessTransactionDocumentParty 37950A. There is one or zero 37948A ProductRecipientParty entity 37946A for each Item entity 37900A. The VendorParty entity 37952A is of type GDT:BusinessTransactionDocumentParty 37956A. There is one or zero 37954A VendorParty entity 37952A for each Item entity 37900A. The DebitorParty entity 37958A is of type GDT:BusinessTransactionDocumentParty 37962A. There is one or zero 37960A DebitorParty entity 37958A for each Item entity 37900A. The CreditorParty entity 37964A is of type GDT:BusinessTransactionDocumentParty 37968A. There is one or zero 37966A CreditorParty entity 37964A for each Item entity 37900A.

Similar to the Tax package 37954 in the TaxDue package 37920, the TaxDueItemTax package 37932A includes a ProductTax entity 37970A. The ProductTax entity 37970A is of type GDT:ProductTax 37974A. There is one or more 37972A ProductTax entities 37970A for each Item entity 37900A.

i) Delivery Information

A DeliveryInformation provides information about the (planned) execution and execution status of a delivery that is to be executed (outbound) or is expected (inbound). It can result from a (confirmed) sales order, a (confirmed) purchase order, or a shipping notification, and is published at fixed times, such as when the delivery is created, when warehouse processing is complete, or when the goods movement is posted. In this document, the term "delivery" refers to inbound and outbound deliveries, i.e., the direction in which the goods flow is not relevant for the interface structure described.

The motivating business scenarios for the DeliveryInformation interface are the "SellFromStock" and "ProcureToStock" scenarios. In the "SellFromStock" scenario, purchase orders are accepted by the customer and generate a request to Logistics to fulfill the order. In this scenario, the order is fulfilled when the ordered goods are delivered to the customer from a goods warehouse. A delivery request to the relevant goods warehouse is generated, which results in a delivery to be executed. At a certain point, delivery execution begins and the delivery to be executed becomes the actual delivery with its various processing statuses. At various points, information about the delivery processing status is provided for the benefit of the interested applications, such as the sales order system or planning system. In this way, for example, customers can use the sales order system to find out the current status of their delivery and the optimum planned delivery date on the basis of the latest data.

In the "ProcureToStock" scenario, goods are ordered from a vendor. The purchase order or purchase order confirmation from the vendor generates a request to Logistics to receive the goods on the requested or confirmed date and place them in storage. The vendor sends an advanced shipping notification, which specifies further details regarding quantities and dates for the request to the warehouse. At a certain point, the goods arrive at the warehouse and the expected delivery becomes the actual delivery with its various processing statuses. At various points, information about the delivery processing status is provided for the benefit of the interested applications, such as the planning system.

The DeliveryInformation is a message about the creation of a delivery, changes made to a delivery, and the execution status of a delivery. The message type DeliveryInformation is based on the message data type DeliveryInformationMessage. The DeliveryInformation covers the entire delivery process. For example, the following delivery statuses can be published: Picked/putaway; Packed/unpacked; Loaded/unloaded; and Goods issue posted/goods receipt posted. Methods and systems consistent with the present invention use the package template for a BusinessTransactionDocument for an SCM Master Data depicted in FIG. 270B to derive the DeliveryInformation interface.

(1) Message Choreography

Figure 382:
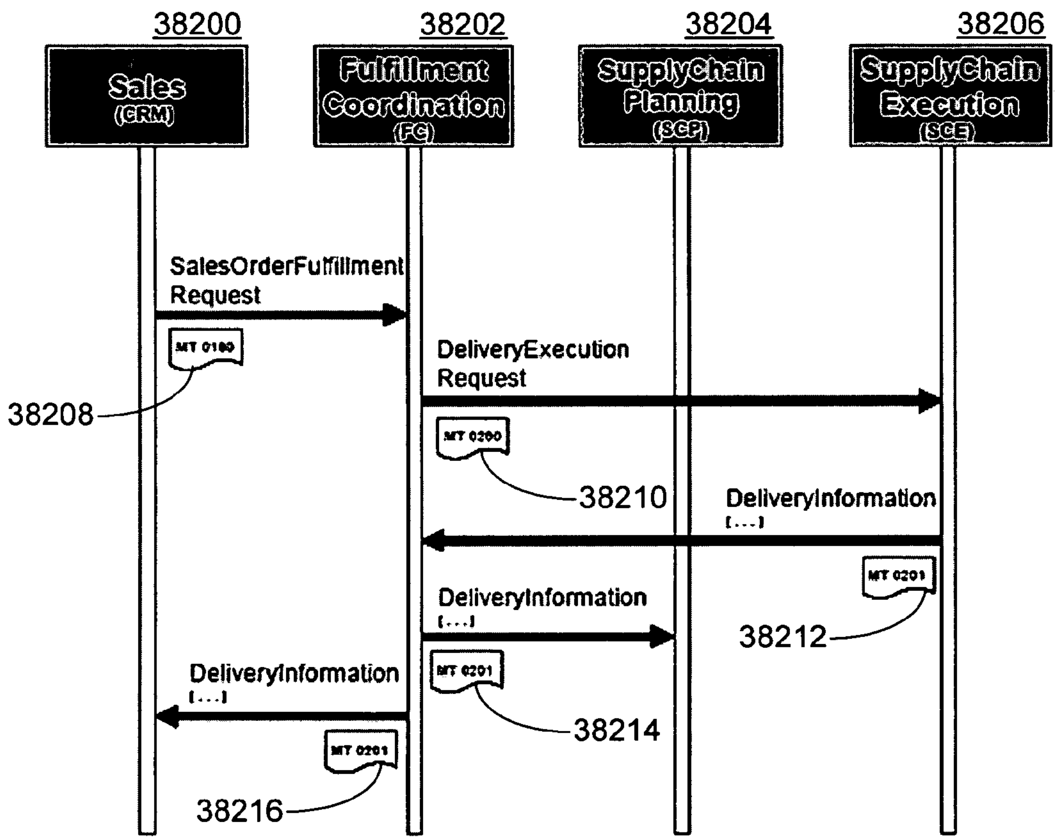
FIG. 382 depicts a message choreography that describes the logical sequence of messages that realizing the scenario between Sales ("CRM"), Fulfillment Coordination ("FC"), Supply Chain Planning ("SCP"), and Supply Chain Execution ("SCE")
Figure 383A:
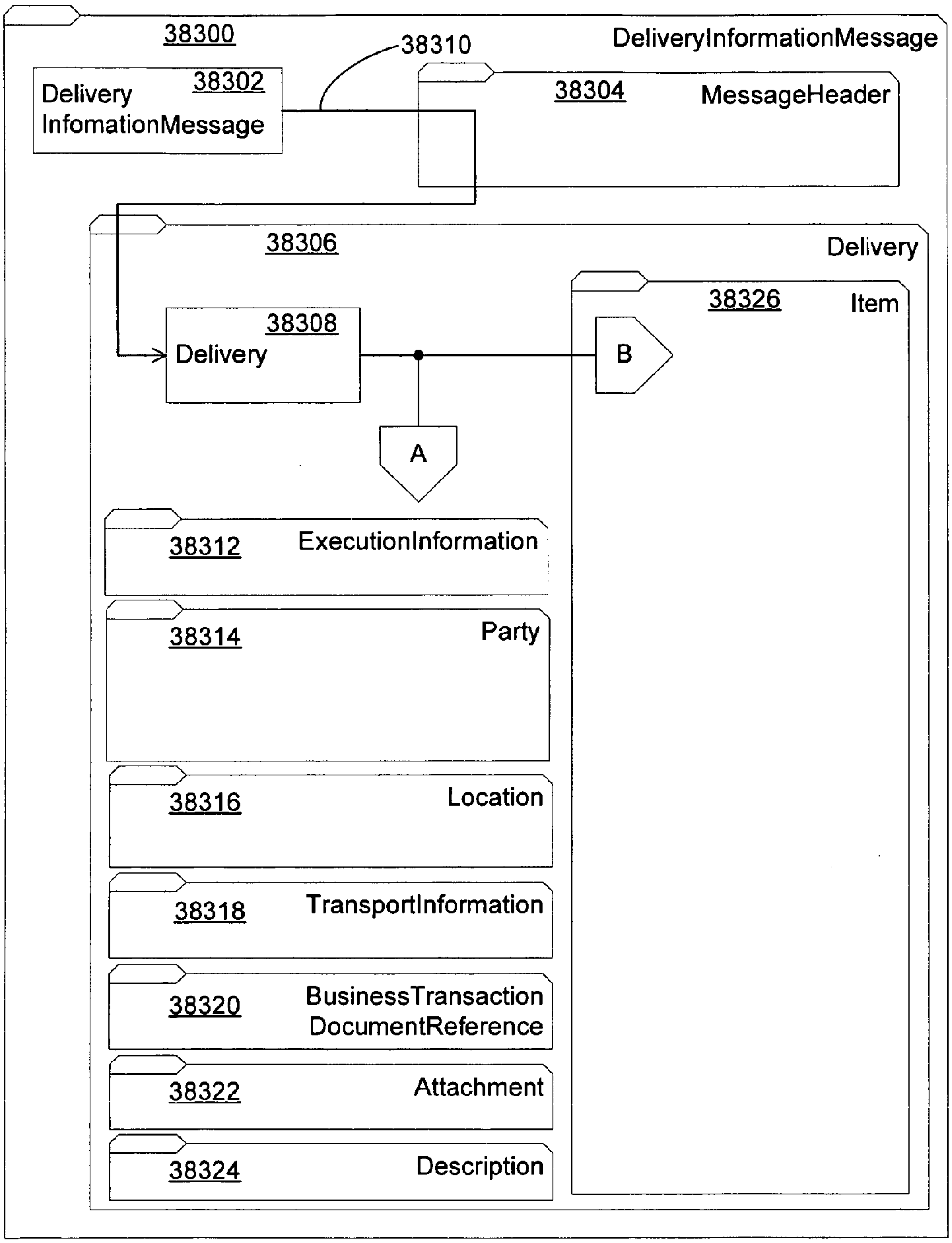
FIG. 383 depicts the data model for the DeliveryInformationMessage message.
Figure 383B:
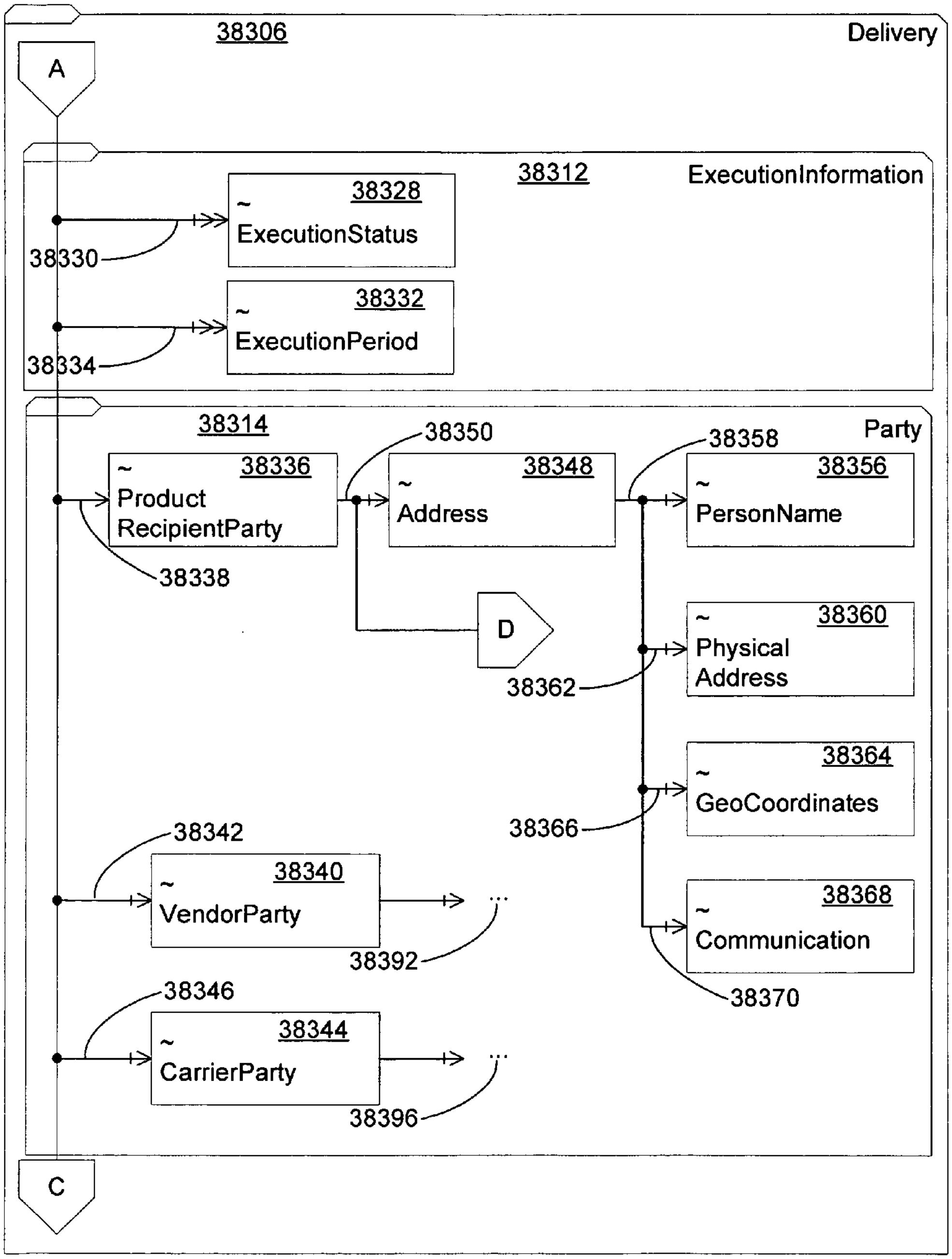
Figure 383C:
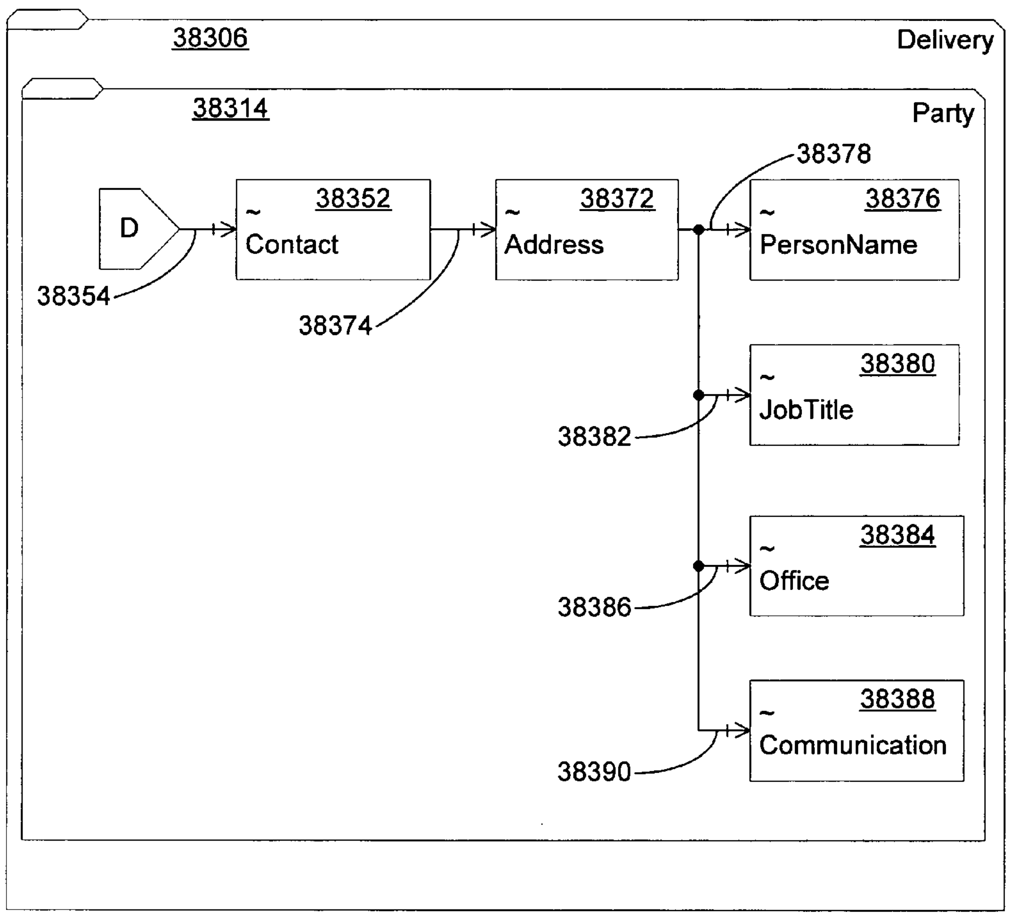
Figure 383D:
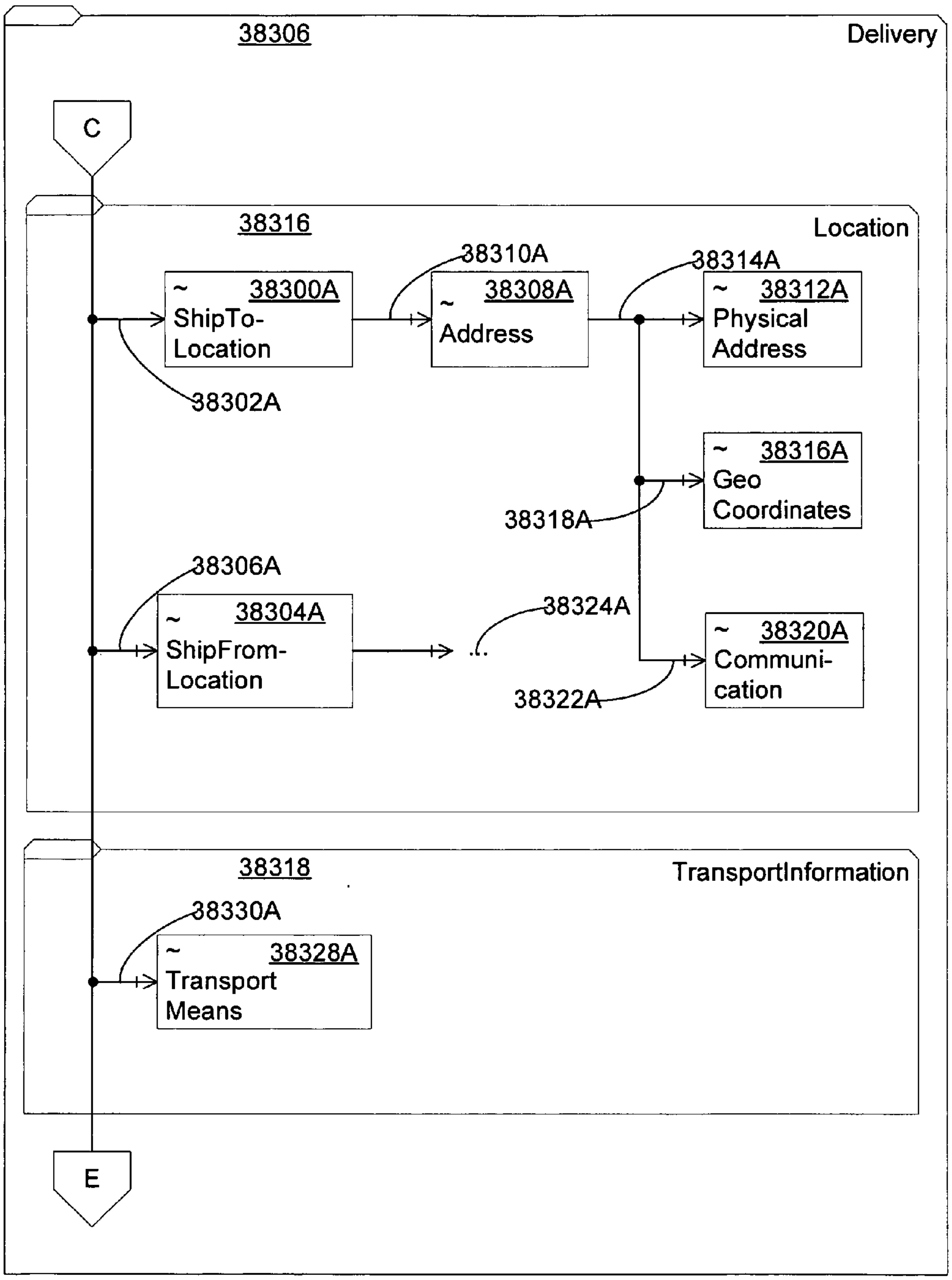
Figure 383E:
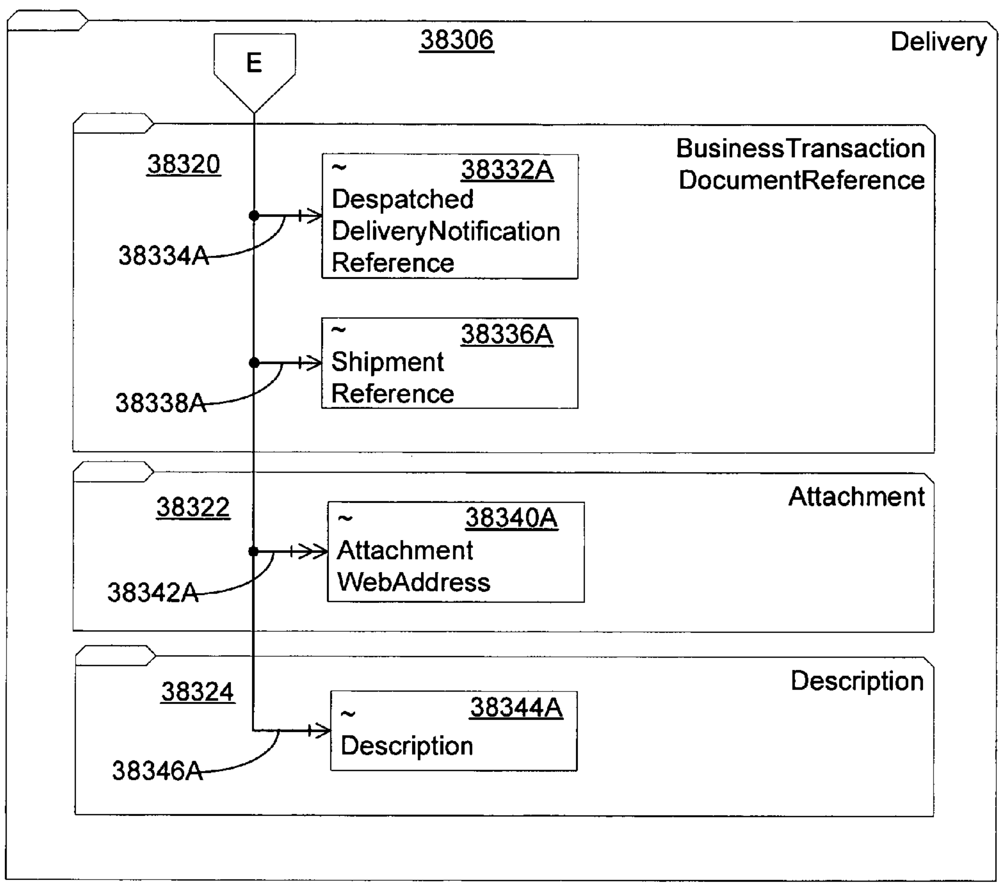
Figure 383F:
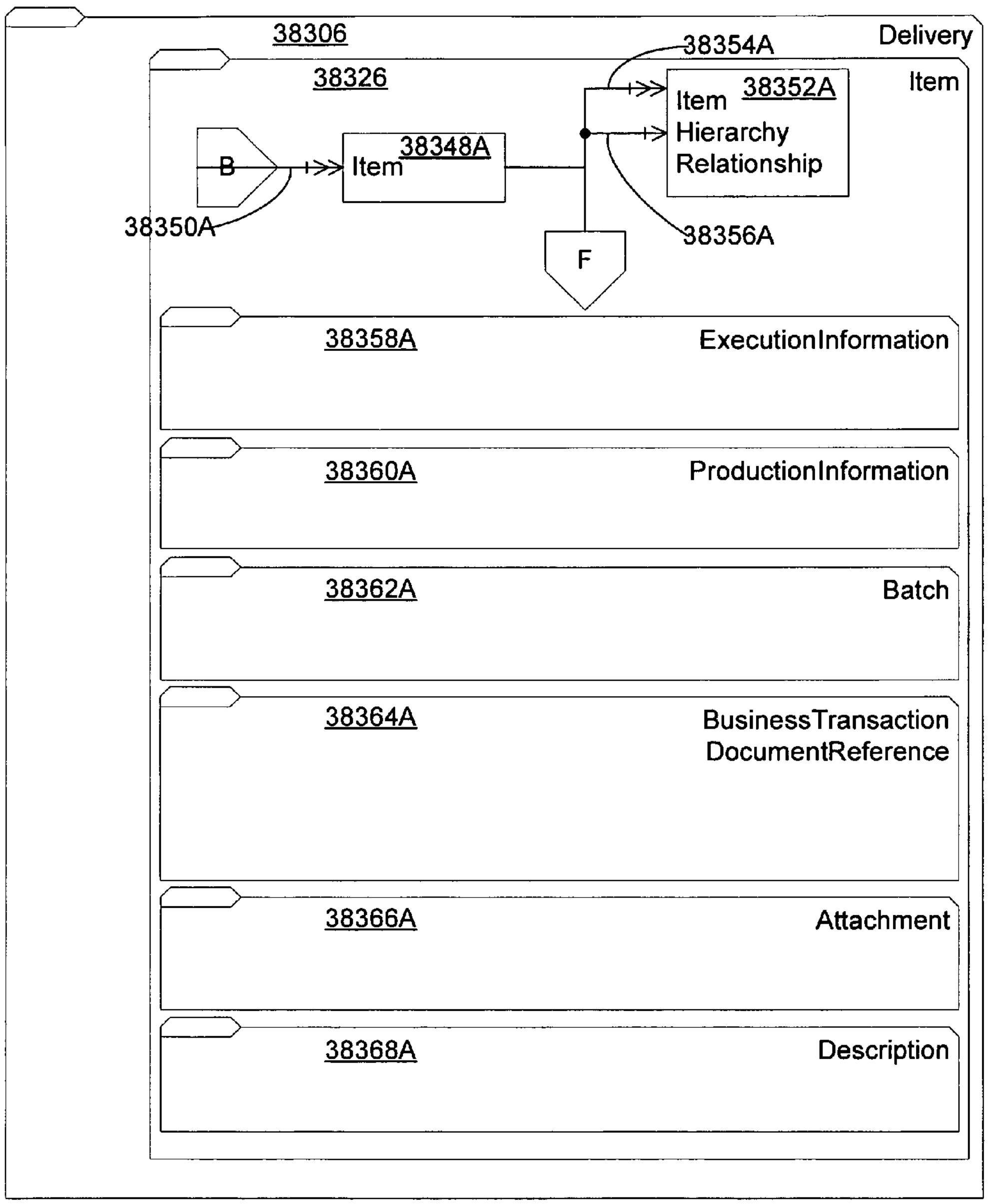
Figure 383G:
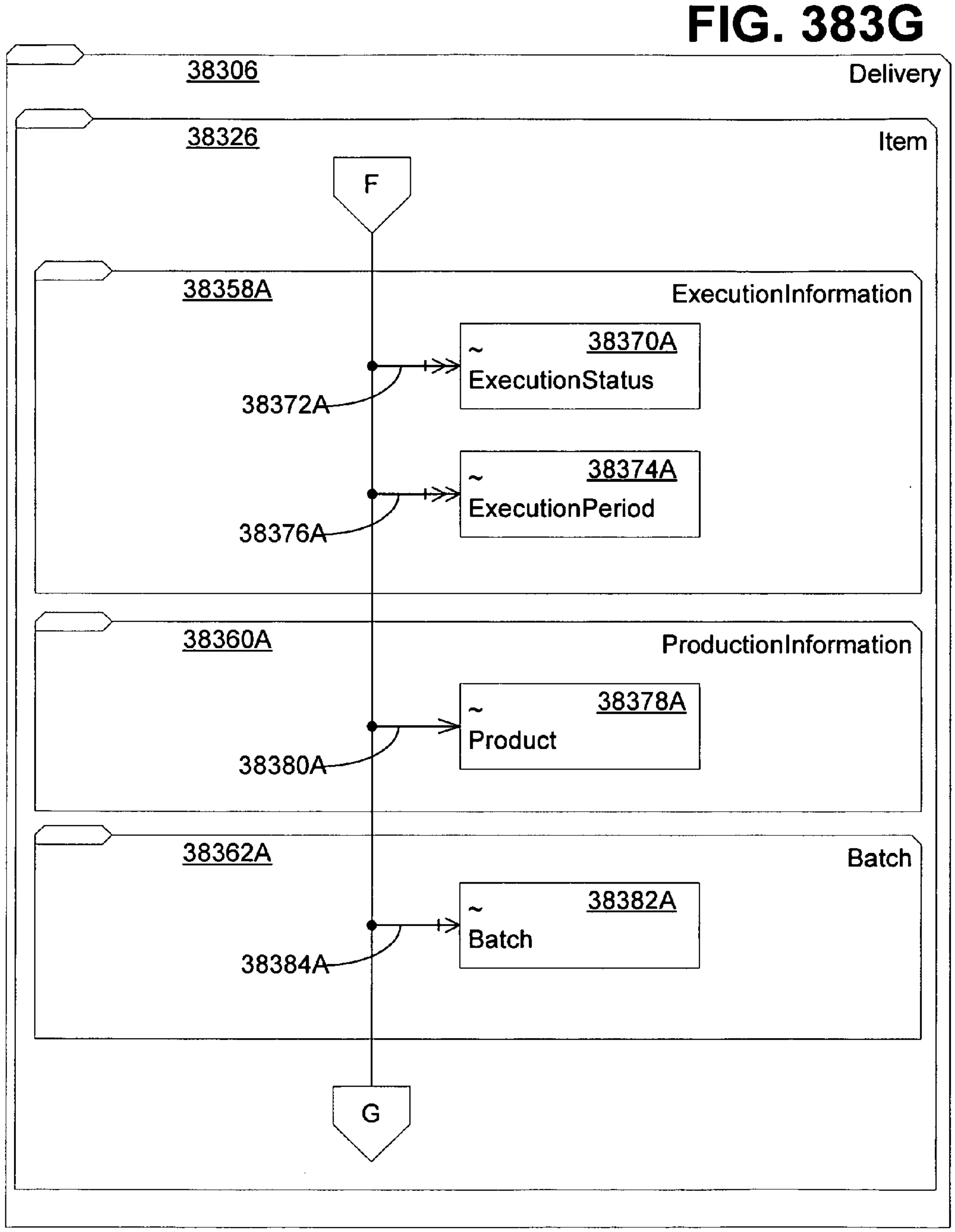
Figure 383H:
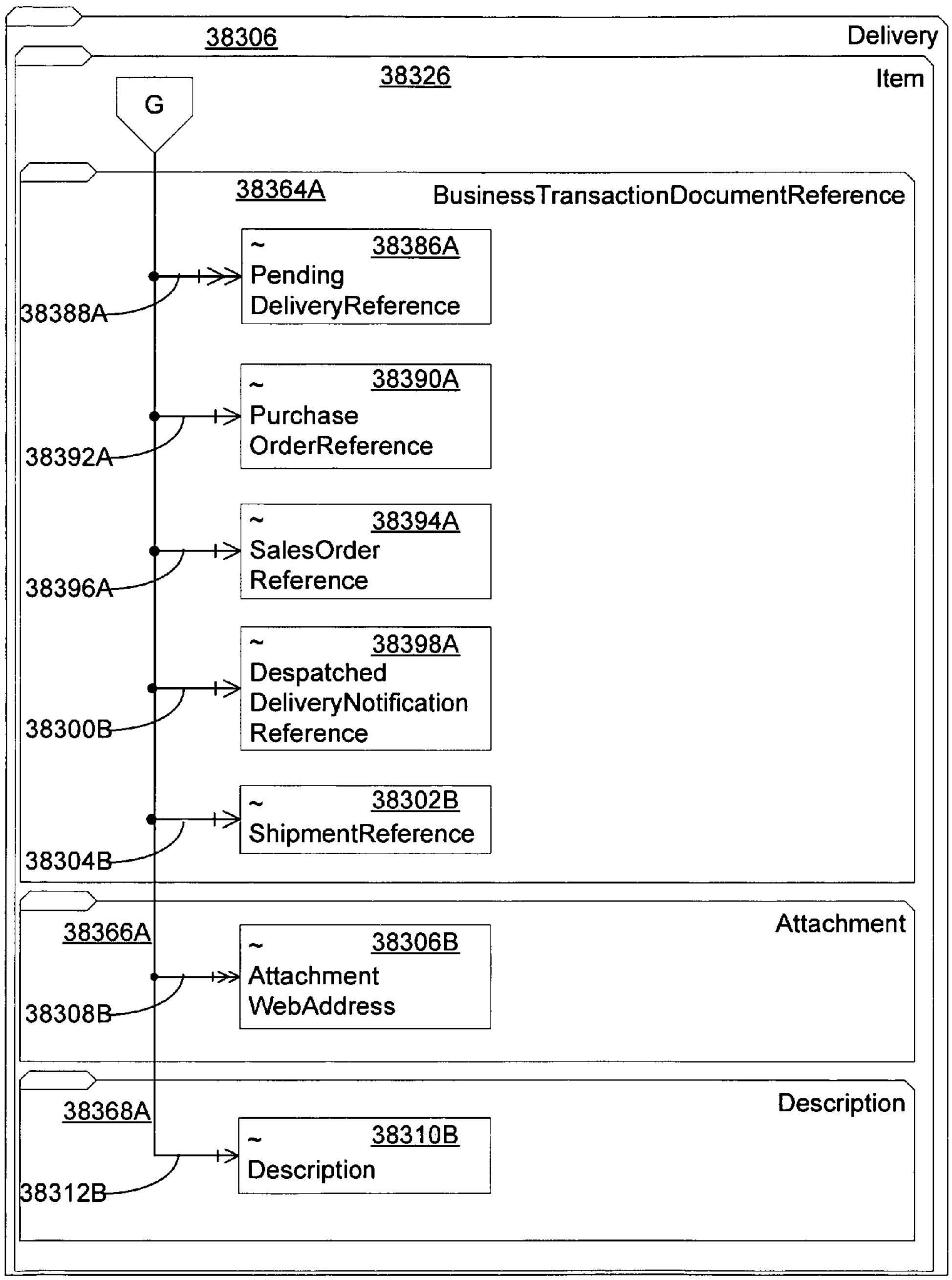

FIG. 382 depicts a message choreography that describes the logical sequence of messages that are necessary to realize the scenario between Sales ("CRM") 38200, Fulfillment Coordination ("FC") 38202, Supply Chain Planning ("SCP") 38204 and Supply Chain Execution ("SCE") 38206. CRM 38200 initially sends a SalesOrderFulfillmentRequest 38208 to FC 38202. The FC 38202 then sends a DeliveryExecutionRequest 38210 to SCE 38206. In response, SCE 38206 sends DeliveryInformation 38212 to FC 38202. FC 38202 then sends DeliveryInformation 38214 to SCP 38204, and sends DeliveryInformation 38216 to CRM 38200. A delivery can be created on the basis of an external delivery request (DeliveryRequest message) or the manual creation of a delivery. Information about the delivery creation and the delivery status is provided in messages of type DeliveryInformation.

(2) Message Data Type Data Model

FIG. 383 depicts the data model for the DeliveryInformationMessage. The message data type DeliveryInformationMessage includes a DeliveryInformationMessage package 38300, which includes a DeliveryInformationMessage entity 38302. The DeliveryInformationMessage package 38300 also includes a MessageHeader package 38304 and a Delivery package 38306. The message data type DeliveryInformationMessage makes the structure available for the message type DeliveryInformation and the relevant interfaces.

(a) Message Header Package

The MessageHeader package 38304 groups together the business information that is relevant for sending a business document in a message. It may include a MessageHeader entity, which groups together the business information from the point of view of the sending application to identify the business document in a message, to provide information about the sender, and to provide any information about the recipient. The MessageHeader entity may be divided into a SenderParty and a RecipientParty, and is of type GDT:BusinessDocumentMessageHeaderParty. The MessageHeader may also include an ID, which is the identification of the business document in the technical message, and a CreationDateTime, which is the creation date of a business document in the technical message. A MessageHeader is optional.

(b) Delivery Package

The Delivery package 38306 groups together a Delivery entity 38308, an ExecutionInformation package 38312, a Party package 38314, a Location package 38316, a Transport- Information package 38318, a BusinessTransactionDocumentReference package 38320, an Attachment package 38322, a Description package 38324, and an Item package 38326. There is a 1:1 relationship 38310 between the DeliveryInformationMessage entity 38302 and the Delivery entity 38308.

A Delivery is a collection of goods that is to be staged for shipment or is to be received—after shipment—for further use within a company. The Delivery entity 38308 is divided into delivery items (DeliveryItems), which describe the execution status and execution period for delivering a particular quantity of a product or batch. References to relevant business documents can be specified for a delivery item. For the delivery as a whole, the ship-from/to location, shipment details, and references to any relevant business documents can be specified alongside the delivering party, recipient, and shipping party.

The Delivery entity 38308 includes an ID, a TypeCode, a DeletedIndicator, a CreationDateTime, a LastChangeDateTime, a GroupID, a GrossWeightMeasure, a NetWeightMeasure, and a VolumeMeasure. The ID is a unique identifier for a delivery, and is of type GDT:BusinessTransactionDocumentID. The TypeCode is the type of delivery (expected, inbound/outbound), and is of type GDT:BusinessTransactionDocumentTypeCode. The DeletedIndicator is an indicator that indicates whether the delivery has been deleted, and is of type GDT:DeletedIndicator. The CreationDateTime is the calendar day and time on which the delivery was created, and is of type GDT:DateTime. The LastChangeDateTime is the date on which the delivery was changed, and is of type GDT: DateTime. The GroupID is the group to which the delivery belongs, and is of type GDT:BusinessTransactionDocumentGroupID. The GrossWeightMeasure is the gross total weight of the delivery, and is of type GDT:Measure. The NetWeightMeasure is the net total weight of the delivery, and is of type GDT:Measure. The VolumeMeasure is the total volume of the delivery, and is of type GDT:Measure.

The values "Inbound Delivery" and "Outbound Delivery" are permitted as the TypeCode. If the DeletedIndicator is set, the items do not have to be transferred; they are implicitly classified as deleted.

(i) Delivery Execution Information Package

The DeliveryExecutionInformation package 38312 groups together information about the delivery execution. It includes an ExecutionStatus entity 38328 and an ExecutionPeriod entity 38332. There is a 1:cn relationship 38330 between the Delivery entity 38308 and the ExecutionStatus entity 38328. There is a 1:cn relationship 38334 between the Delivery entity 38308 and the ExecutionPeriod entity 38332.

The ExecutionStatus entity 38328 specifies the type and execution status of delivery processing reached for the items or the delivery as a whole. The ExecutionStatus entity 38328 includes a DeliveryExecutionStatusCode, a PickingExecutionStatusCode, a PackingExecutionStatusCode, a LoadingExecutionStatusCode, an IssueExecutionStatusCode, an UnloadingExecutionStatusCode, a PutawayExecutionStatusCode, and a ReceiptExecutionStatusCode. The DeliveryExecutionStatusCode is the status of the entire delivery process, and is of type GDT: BusinessTransactionExecutionStatusCode. The PickingExecutionStatusCode is the status of the picking process for the entire delivery, and is of type GDT:BusinessTransactionExecutionStatusCode. The PackingExecutionStatusCode is the status of the packing process for the entire delivery, and is of type GDT: BusinessTransactionExecutionStatusCode. The LoadingExecutionStatusCode is the status of the loading process for the entire delivery, and is of type GDT: BusinessTransactionExecutionStatusCode. The IssueExecutionStatusCode is the status of the goods issue process for the entire delivery, and is of type GDT: BusinessTransactionExecutionStatusCode. The UnloadingExecutionStatusCode is the status of the unloading process for the entire delivery, and is of type GDT: BusinessTransactionExecutionStatusCode. The PutawayExecutionStatusCode is the status of the putaway process for the entire delivery, and is of type GDT: BusinessTransactionExecutionStatusCode. The ReceiptExecutionStatusCode is the status of the goods receipt process for the entire delivery, and is of type GDT: BusinessTransactionExecutionStatusCode.

The status specifies the processing status for the entire delivery. The processing status for individual items, however, can be further advanced than that for the entire delivery. More than one processing status can be specified (such as delivery arrived, fully unloaded, partially putaway) for the entire delivery. For document types D01 (Inbound Delivery) and D02 (Outbound Delivery), ExecutionStatusCodes are permitted; for document types D03 (Expected Inbound Delivery) and D04 (Pending Outbound Delivery), the DeliveryExecutionStatusCode is permitted. The different processes that are carried out while a delivery is processed are not entirely independent of each other. Different parts of the delivery can be processed at different times. For example, one part of the delivery can already be packed ready for loading, while another part has either not left the warehouse/the shelf.

The ExecutionPeriod is the planned or current period or time at which a particular step of the delivery process is to be completed or has been completed. The ExecutionPeriod entity 38332 includes a PositioningPeriod, a PickingPeriod, a PackingPeriod, a LoadingPeriod, an IssuePeriod, a DeliveryPeriod, an UnloadingPeriod, a PutawayPeriod, and a ReceiptPeriod. The PositioningPeriod is the period for material staging, and is of type GDT:DateTimePeriod. The PickingPeriod is the period for removal from storage, picking, and is of type GDT: DateTimePeriod. The PackingPeriod is the period for packing, and is of type GDT: DateTimePeriod. The LoadingPeriod is the period for loading, and is of type GDT: DateTimePeriod. The IssuePeriod is the period for goods issue, and is of type GDT: DateTimePeriod. The DeliveryPeriod is the period for delivery, and is of type GDT: DateTimePeriod. The UnloadingPeriod is the period for unloading, and is of type GDT: DateTimePeriod. The PutawayPeriod is the period for putaway, and is of type GDT: DateTimePeriod. The ReceiptPeriod is the period for goods receipt, and is of type GDT: DateTimePeriod.

If a corresponding ExecutionStatus exists for a period, the period can be specified if the ExecutionStatus is also specified. Depending on the ExecutionStatus, the time specifications are interpreted as planned or actual durations and dates. Certain time specifications, such as when an entire delivery leaves the plant or when it arrives/will arrive, are provided for the entire delivery. If periods are specified here that are also specified in the Item package (such as the putaway period), an inheritance logic does not apply; the period specified here instead refers to the delivery as a whole, i.e., one item is put away between 10 a.m. and 11 a.m. while another is put away between 11 a.m. and 12 p.m. The putaway period for the entire delivery, therefore, would be from 10 a.m. to 12 p.m., i.e., the entire delivery is not put away completely until 12 p.m.

(ii) Party Package

The Party package 38314 groups together the business partners that can be involved in a business delivery process. It includes a ProductRecipientParty entity 38336, a VendorParty entity 38340, and a CarrierParty entity 38344. The Party package 38314 may also include a BuyerParty entity, a SellerParty entity, a BillToParty entity, a PayerParty entity, a BillFromParty entity, and a PayeeParty entity for deliveries without a reference for an order. This data is normally entered or determined in the base order and is not relevant for delivery processing. In particular, it cannot be changed while the delivery is being processed. Since the process for deliveries without a reference is still to be clarified, these partners will not be discussed here.

The ProductRecipientParty is the company or person to which goods are to be delivered. The ProductRecipientParty entity 38336 is of type GDT:BusinessTransactionDocumentParty. There is a 1:1 relationship 38338 between the Delivery entity 38308 and the ProductRecipientParty entity 38336. The InternalID is typically used, and may be mandatory. In a delivery process in supply chain execution, the ShipToLocation is used as the delivery address rather than the address of the ProductRecipientParty. An important part of the ProductRecipientParty in the delivery process, however, is the specified contact person (Contact) for any queries relating to a delivery.

The ProductRecipientParty entity 38336 includes an Address entity 38348 and a Contact entity 38352. There is a 1:c relationship 38350 between the ProductRecipientParty entity 38336 and the Address entity 38348. There is also a 1:c relationship 38354 between the ProductRecipientParty entity 38336 and the Contact entity 38352. The Address entity 38348 includes a PersonName entity 38356, a PhysicalAddress entity 38360, a GeoCoordinates entity 38364, and a Communication entity 38368. There is a 1:c relationship 38358 between the Address entity 38348 and the PersonName entity 38356. There is a 1:c relationship 38362 between the Address entity 38348 and the PhysicalAddress entity 38360. There is a 1:c relationship 38366 between the Address entity 38348 and the GeoCoordinates entity 38364. There is a 1:c relationship 38370 between the Address entity 38348 and the Communication entity 38368.

The Contact entity 38352 includes an Address entity 38372. There is a 1:c relationship 38374 between the Contact entity 38352 and the Address entity 38372. The Address entity 38372 includes a PersonName entity 38376, a JobTitle entity 38380, an Office entity 38384, and a Communication entity 38388. There is a 1:c relationship 38378 between the Address entity 38372 and the PersonName entity 38376. There is a 1:c relationship 38382 between the Address entity 38372 and the JobTitle entity 38380. There is a 1:c relationship 38386 between the Address entity 38372 and the Office entity 38384. There is a 1:c relationship 38390 between the Address entity 38372 and the Communication entity 38388.

The VendorParty is the company or person who is to deliver goods. The VendorParty entity 38340 is of type GDT:BusinessTransactionDocumentParty. There is a 1:c relationship 38342 between the Delivery entity 38308 and the VendorParty entity 38340. The InternalID is typically used, and may be mandatory. In a delivery process in supply chain execution, the ShipFromLocation is used as the delivery address rather than the address of the VendorParty. An important part of the ProductRecipientParty in the delivery process, however, is the specified contact person (Contact) for any queries relating to a delivery. The VendorParty entity 38340 includes the same elements as the ProductRecipientParty entity 38336, as denoted by ellipses 38392.

The CarrierParty is the company or person who ships the goods. The CarrierParty entity 38344 is of type GDT:BusinessTransactionDocumentParty. There is a 1:c relationship 38346 between the Delivery entity 38308 and the CarrierParty entity 38344. The InternalID is used, and may be mandatory. The CarrierParty entity 38344 includes the same elements as the ProductRecipientParty entity 38336, as denoted by ellipses 38396.

(iii) Location Package

The Location package 38316 groups together the locations that can occur in a delivery process. It includes a ShipToLocation entity 38300A and a ShipFromLocation entity 38304A. There is a 1:1 relationship 38302A between the Delivery entity 38308 and the ShipToLocation entity 38300A. There is a 1:c relationship 38306A between the Delivery entity 38308 and the ShipFromLocation entity 38304A. The ShipToLocation and the ShipFromLocation can be used to provide a detailed description of the flow of goods between the ship-to and ship-from location.

The ShipToLocation is the location to which goods are shipped. The ShipToLocation entity 38300A is of type GDT: BusinessTransactionDocumentLocation. The InternalID is used, and may be mandatory. The ShipToLocation entity 38300A includes an Address entity 38308A. There is a 1:c relationship 38310A between the ShipToLocation entity 38300A and the Address entity 38308A. The Address entity 38308A includes a PhysicalAddress entity 38312A, a GeoCoordinates entity 38316A, and a Communication entity 38320A. There is a 1:c relationship 38314A between the Address entity 38308A and the PhysicalAddress entity 38312A. There is a 1:c relationship 38318A between the Address entity 38308A and the GeoCoordinates entity 38316A. There is a 1:c relationship 38322A between the Address entity 38308A and the Communication entity 38320A.

The ShipFromLocation is the location from which goods are shipped. The ShipFromLocation entity 38304A is of type GDT:BusinessTransactionDocumentLocation. There is a 1:c relationship 38306A between the Delivery entity 38308 and the ShipFromLocation entity 38304A. The InternalID is used, and may be mandatory. The ShipFromLocation entity 38304A includes the same elements as the ShipToLocation entity 38300A, as denoted by ellipses 38324A.

(iv) Transportation Information Package

The TransportInformation package 38318 groups together the shipment information for a delivery. It includes a TransportMeans entity 38328A. There is a 1:c relationship 38330A between the Delivery entity 38308 and the TransportMeans entity 38328A.

The TransportMeans describes the means of transport and can also include information for identifying it in greater detail. The TransportMeans entity 38328A is of type GDT: TransportMeans.

(v) Business Transaction Document Reference Package

The BusinessTransactionDocumentReference package 38320 groups together the references to business documents that can occur in the delivery process. It includes a DespatchedDeliveryNotificationReference entity 38332A and a ShipmentReference entity 38336A. There is a 1:c relationship 38334A between the Delivery entity 38308 and the DespatchedDeliveryNotificationReference entity 38332A. There is a 1:c relationship 38338A between the Delivery entity 38308 and the ShipmentReference entity 38336A. If notified delivery items or shipment items can be assigned directly to an item, the reference is used at the item level.

The DespatchedDeliveryNotificationReference is the reference to an advanced shipping notification that has already been sent. The DespatchedDeliveryNotificationReference entity 38332A is of type GDT: BusinessTransactionDocumentReference. The DespatchedDeliveryNotificationReference is normally specified for an inbound delivery if the delivery of goods is notified in advance by the vendor. If the items in a delivery can be assigned to the items in a shipping notification (ASN), the corresponding reference is specified at the item level.

The ShipmentReference is the reference to a shipment. The ShipmentReference entity 38336A is of type GDT: BusinessTransactionDocumentReference. If the items in a delivery can be assigned to the items in a shipment, the corresponding reference is specified in the BusinessTransactionDocumentReference package within the Item package.

(vi) Attachment Package

The Attachment package 38322 groups together the Attachment information relating to the delivery. It includes an AttachmentWebAddress entity 38340A. There is a 1:cn relationship 38342A between the Delivery entity 38308 and the Attachment entity 38340A.

The AttachmentWebAddress refers to a web address for a document of any type, i.e. assigned to a DeliveryInformation as an attachment. The AttachmentWebAddress entity 38340A is of type GDT: WebAddress.

(vii) Description Package

The Description package 38324 groups together the explanatory texts regarding the delivery. It includes a Description entity 38344A, which is a natural-language text regarding the delivery, and is visible to business partners. The Description entity 38344A is of type GDT: Description. There is a 1:c relationship 38346A between the Delivery entity 38308 and the Description entity 38344A. The Description can be used for the textual information about the transferred delivery and not just the current message.

(viii) Delivery Item Package

The DeliveryItem package 38326 groups together the data that describes the execution status and execution period for delivering a particular quantity of a product or batch. It includes an ExecutionInformation package 38358A, a ProductInformation package 38360A, a Batch package 38362A, a BusinessTransactionDocumentReference package 38364A, an Attachment package 38366A, and a Description package 38368A. The DeliveryItem package 38326 also includes a DeliveryItem entity 38348A. There is a 1:cn relationship 38350A between the Delivery entity 38308 and the DeliveryItem entity 38348A. Items are arranged hierarchically using a Hierarchy Relationship 38352A. The Hierarchy Relationship 38352A is the relationship between a sub-item and a higher-level parent item in an item hierarchy. There is a 1:cn relationship 38354A between the Item entity 38348A and its subordinate entities, and a 1:c relationship 38356A between the Item entity 38348A and its superordinate entities.

The DeliveryItem is an item that specifies a quantity of a product to be delivered and includes additional information about its delivery processing status along with any references to previous business documents. The Item entity 38348A includes an ID, a TypeCode, a CreationDateTime, a LastChangeDateTime, a GroupID, a HierachyRelationship, a Quantity, a SalesOrderQuantity, a PurchaseOrderQuantity, and an InventoryQuantity.

The ID is a unique key for a delivery item, which is of type GDT: BusinessTransactionDocumentItemID. The TypeCode is the type of delivery item, which is of type GDT: BusinessTransactionDocumentItemTypeCode. The CreationDateTime is the date on which a delivery item was created, which is of type GDT: DateTime. The LastChangeDateTime is the date on which a delivery item was changed, which is of type GDT: DateTime. The GroupID is the group to which a delivery item belongs, which is of type GDT: BusinessTransactionDocumentItemGroupID. The HierachyRelationship includes a ParentItemID, which is the ID of the higher-level item and is of type GDT: BusinessTransactionDocumentItemID, and a TypeCode, which is the type of hierarchy relationship and is of type GDT: BTDItemHierarchyRelationshipTypeCode. The Quantity is the quantity in the delivery unit, which is of type GDT: Quantity. The SalesOrderQuantity is the quantity in the sales unit, which is of type GDT: Quantity. The PurchaseOrderQuantity is the quantity in the order unit, which is of type GDT: Quantity. The InventoryQuantity is the quantity in the stock unit, which is of type GDT: Quantity.

From a semantic point of view, items can contain other items. This enables item hierarchies to be mapped. The hierarchies are mapped using a ParentItemID and an ItemHierarchyTypeCode. The value “D01” (Delivery Item) is permitted as a TypeCode.

(a) Delivery Item Execution Information Package

The DeliveryItemExecutionInformation package 38358A groups together information about the execution of a delivery item. It includes a DeliveryItemExecutionStatus entity 38370A and a DeliveryItemExecutionPeriod entity 38374A. There is a 1:cn relationship 38372A between the Item entity 38348A and the DeliveryItemExecutionStatus entity 38370A. There is a 1:cn relationship 38376A between the Item entity 38348 and the DeliveryItemExecutionPeriod entity 38374A.

The DeliveryItemExecutionStatus specifies the type and execution status of delivery processing reached for this item. The DeliveryItemExecutionStatus entity 38370A includes a DeliveryExecutionStatusCode, a PickingExecutionStatusCode, a PackingExecutionStatusCode, a LoadingExecutionStatusCode, an IssueExecutionStatusCode, an UnloadingExecutionStatusCode, a PutawayExecutionStatusCode, and a ReceiptExecutionStatusCode.

The DeliveryExecutionStatusCode is the status of the entire delivery process, which is of type GDT: BusinessTransactionExecutionStatusCode. The PickingExecutionStatusCode is the status of the picking process for the delivery item, which is of type GDT: BusinessTransactionExecutionStatusCode. The PackingExecutionStatusCode is the status of the packing process for the delivery item, which is of type GDT: BusinessTransactionExecutionStatusCode. The LoadingExecutionStatusCode is the status of the loading process for the delivery item, which is of type GDT: BusinessTransactionExecutionStatusCode. The IssueExecutionStatusCode is the status of the goods issue process for the delivery item, which is of type GDT: BusinessTransactionExecutionStatusCode. The UnloadingExecutionStatusCode is the status of the unloading process for the delivery item, which is of type GDT: BusinessTransactionExecutionStatusCode. The PutawayExecutionStatusCode is the status of the putaway process for the delivery item, which is of type GDT: BusinessTransactionExecutionStatusCode. The ReceiptExecutionStatusCode is the status of the goods receipt process for the delivery item, which is of type GDT: BusinessTransactionExecutionStatusCode.

The status specifies the processing status of a delivery item. The processing status for individual items can be further advanced than that for the entire delivery. For document types D01 (Inbound Delivery) and D02 (Outbound Delivery), ExecutionStatusCodes are permitted; for document types D03 (Expected Inbound Delivery) and D04 (Pending Outbound Delivery), the DeliveryExecutionStatusCode is permitted. The different processes that are carried out while a delivery item is processed are not entirely independent of each other. Different parts of the delivery item can be processed at different times. For example, one part of the delivery item can already be packed ready for loading, while another part has either not left the warehouse/the shelf.

The DeliveryItemExecutionPeriod is the planned or current period or time at which a particular delivery item process is to be completed or has been completed. The DeliveryItemExecutionPeriod entity 38374A includes a PositioningPeriod, a PickingPeriod, a PackingPeriod, a LoadingPeriod, an IssuePeriod, a DeliveryPeriod, an UnloadingPeriod, a PutawayPeriod, and a ReceiptPeriod.

The PositioningPeriod is the period for material staging, which is of type GDT: DateTimePeriod. The PickingPeriod is the period for removal from storage, picking, which is of type GDT: DateTimePeriod. The PackingPeriod is the period for packing, which is of type GDT: DateTimePeriod. The LoadingPeriod is the period for loading, which is of type GDT: DateTimePeriod. The IssuePeriod is the period for goods issue, which is of type GDT: DateTimePeriod. The DeliveryPeriod is the period for delivery, which is of type GDT: DateTimePeriod. The UnloadingPeriod is the period for unloading, which is of type GDT: DateTimePeriod. The PutawayPeriod is the period for putaway, which is of type GDT: DateTimePeriod. The ReceiptPeriod is the period for goods receipt, which is of type GDT: DateTimePeriod.

If a corresponding ExecutionStatus exists for a period, the period can be specified if the ExecutionStatus is also specified. Depending on the ExecutionStatus, the time specifications are interpreted as planned or actual durations and dates.

(b) Delivery Item Product Information Package

DeliveryItemProductInformation package 38360A groups together the information for identifying and describing a product in a delivery item. It includes a DeliveryItemProduct entity 38378A. There is a 1:1 relationship 38380A between the Item entity 38348A and the DeliveryItemProduct entity 38378A.

The DeliveryItemProduct identifies and describes the product to be delivered or the product that has been delivered. The DeliveryItemProduct entity 38378A is of type GDT: BusinessTransactionDocumentProduct. The InternalID is used, and may be mandatory.

(c) Delivery Item Batch Package

The DeliveryItemBatch package 38362A groups together the batch information for the product ordered in a purchase order item or sales order item. The DeliveryItemBatch package 38362A includes a DeliveryItemBatch entity 38382A. There is a 1:c relationship 38384A between the Item entity 38348A and the DeliveryItemBatch entity 38382A.

The DeliveryItemBatch is a batch and its properties. A partial quantity of a particular material, a batch is a homogeneous, non-reproducible unit with unique specifications. The DeliveryItemBatch entity 38382A is of type GDT: Batch and includes a BatchID, which is of type GDT: BatchID.

(d) Delivery Item Business Transaction Document Reference Package

The DeliveryItemBusinessTransactionDocumentReference package 38364A groups together the references to business documents that can occur in the delivery process for a delivery item or product that has been delivered. It includes a PendingDeliveryReference entity 38386A, a PurchaseOrderReference entity 38390A, a SalesOrderReference entity 38394A, a DespatchedDeliveryNotificationReference entity 38398A, and a ShipmentReference entity 38302B. There is a 1:cn relationship 38388A between the Item entity 38348A and the PendingDeliveryReference entity 38386A. There is a 1:c relationship 38392A between the Item entity 38348A and the PurchaseOrderReference entity 38390A. There is a 1:c relationship 38396A between the Item entity 38348A and the SalesOrderReference entity 38394A. There is a 1:c relationship 38300B between the Item entity 38348A and the DespatchedDeliveryNotificationReference entity 38398A. There is a 1:c relationship 38304B between the Item entity 38348A and the ShipmentReference entity 38302B.

The PendingDeliveryReference refers to an item in a delivery that is to be executed or expected. The PendingDeliveryReference entity 38386A is of type GDT: BusinessTransactionDocumentReference. A reference to the pending delivery is specified in the DeliveryExecutionInfo message.

The PurchaseOrderReference refers to an item in a purchase order. The PurchaseOrderReference entity 38390A is of type GDT: BusinessTransactionDocumentReference. The PurchaseOrderReference entity 38390A may include a unique purchase order number assigned by the buyer or procurement system. The PurchaseOrderReference entity 38390A also may include the reference to the base purchase order item to which the delivery item refers. If this reference exists, it is unique. For this reason, the SalesOrderReference is not filled when the PurchaseOrderReference is specified.

The SalesOrderReference refers to an item in a sales order. The SalesOrderReference entity 38394A is of type GDT: BusinessTransactionDocumentReference. The SalesOrderReference includes a unique order number assigned by the seller or sales system. The SalesOrderReference may include the reference to the base order item to which the delivery item refers. If this reference exists, it is unique. For this reason, the PurchaseOrderReference is typically not filled when the SalesOrderReference is specified.

The DespatchedDeliveryNotificationReference is the reference to a shipping notification that has already been sent. The DespatchedDeliveryNotificationReference entity 38398A is of type GDT: BusinessTransactionDocumentReference. The DespatchedDeliveryNotificationReference is normally specified for an inbound delivery (Inbound) if the delivery of goods is notified in advance by the vendor. If the items in an inbound delivery can be assigned to the items in an ASN, the corresponding reference is specified here and not in the BusinessTransactionDocumentReference package in the Delivery entity.

The ShipmentReference refers to a shipment. The ShipmentReference entity 38302B is of type GDT: BusinessTransactionDocumentReference. If the items in a delivery can be assigned to the items in a shipment, the corresponding reference is specified here and not in the BusinessTransactionDocumentReference package in the DeliveryInfo package.

(e) Delivery Item Attachment Package

The DeliveryItemAttachment package 38366A groups together the Attachment information relating to the delivery item. It includes an AttachmentWebAddress entity 38306B. There is a 1:cn relationship 38308B between the Item entity 38348A and the AttachmentWebAddress entity 38306B.

The AttachmentWebAddress refers to a web address for a document of any type that is assigned to a DeliveryInformationItem as an attachment. The AttachmentWebAddressis entity 38306B is of type GDT: WebAddress.

(ix) Delivery Item Description Package

The DeliveryItemDescription package 38368A groups together the explanatory texts regarding the delivery item. It includes a DeliveryItemDescription entity 38310B. There is a 1:c relationship 38312B between the Item entity 38348A and the DeliveryItemDescription entity 38310B.

The DeliveryItemDeliveryItemDescription is a natural-language text regarding the delivery item, which is visible to business partners. The DeliveryItemDescription entity 38310B is of type GDT: Description. The Description can be used for textual information about the transferred delivery item.

(3) Message Data Type Element Structure

The message data type element structure for the DeliveryInformation message is depicted in FIG. 384A-J. The element structure is similar to the data model, but provides additional information regarding the details of the interface. The element structure identifies the different packages 38400 in the interface, and represents the entities at various levels within the interface. As depicted in FIG. 384, the interface for DeliveryInformation includes five levels 38402, 38404, 38406, 38408, and 38410. The element structure identifies the cardinality or occurrence 38412 and the data type 38414 information for the elements at the respective levels 38402, 38404, 38406, 38408, 38410 in the respective package 38400.

The outermost package of this interface is a DeliveryInformationMessage package 38416, which includes a DeliveryInformationMessage entity 38418 at the first level 38402. The DeliveryInformationMessage entity 38418 is of type GDT DeliveryInformation 38420. The DeliveryInformationMessage package 38416 includes a MessageHeader package 38422 and a Delivery package 38424.

The MessageHeader package 38422 includes a MessageHeader entity 38426 at the second level 38404. The MessageHeader entity 38426 is of type GDT MessageHeader 38430, and there is zero or one 38428 MessageHeader entity 38426 for each DeliveryInformationMessage entity 38418.

The Delivery package 38424 includes one 38434 Delivery entity 38432 for each DeliveryInformationMessage entity 38418. The Delivery entity 38432 includes an ID 38436, a TypeCode 38442, a DeletedIndicator 38448, a CreationDateTime 38454, a LastChangeDateTime 38460, a GroupID 38466, a GrossWeightMeasure 38472, a NetWeightMeasure 38478, and a VolumeMeasure 38484 at the third level 38406. The ID 38436 is of type GDT BusinessTransactionDocumentID 38440, and there is one 38438 ID 38436 for each Delivery entity 38432. The TypeCode 38442 is of type GDT BusinessTransactionDocumentTypeCode 38446, and there is one 38444 TypeCode 38442 for each Delivery entity 38432. The DeletedIndicator 38448 is of type GDT DeletedIndicator 38452, and there is zero or one 38450 DeletedIndicator 38448 for each Delivery entity 38432. The CreationDateTime 38454 is of type GDT DateTime 38458, and there is one 38456 CreationDateTime 38454 for each Delivery entity 38432. The LastChangeDateTime 38460 is of type GDT DateTime 38464, and there is zero or one 38462 LastChangeDateTime 38460 for each Delivery entity 38432. The GroupID 38466 is of type GDT BusinessTransactionDocumentGroupID 38470, and there is zero or one 38468 GroupID 38466 for each Delivery entity 38432. The GrossWeightMeasure 38472 is of type GDT Measure 38476, and there is zero or one 38474 GrossWeightMeasure 38472 for each Delivery entity 38432. The NetWeightMeasure 38478 is of type GDT Measure 38482, and there is zero or one 38480 NetWeightMeasure 38478 for each Delivery entity 38432. The VolumeMeasure 38484 is of type GDT Measure 38488, and there is zero or one 38486 VolumeMeasure 38484 for each Delivery entity 38432.

The Delivery package 38424 also includes an ExecutionInformation package 38490, a Party package 38492, a Location package 38494, a TransportationInformation package 38496, a BusinessTransactionDocumentReference package 38498, an Attachment package 38400A, a Description package 38402A, and a DeliveryItem package 38404A. The ExecutionInformation package 38490 includes zero or one 38408A ExecutionStatus entity 38406A and zero or one 38442A ExecutionPeriod entity 38440A at the third level 38406.

The ExecutionStatus entity 38406A includes a DeliveryExecutionStatusCode 38410A, a PickingExecutionStatusCode 38416A, an IssueExecutionStatusCode 38422A, a PutawayExecutionStatusCode 38428A, and a RecipientExecutionStatusCode 38434A at the fourth level 38408. The DeliveryExecutionStatusCode 38410A is of type GDT BusinessTransactionExecutionStatusCode 38414A, and there is zero or one 38412A DeliveryExecutionStatusCode 38410A for each ExecutionStatus entity 38406A. The PickingExecutionStatusCode 38416A is of type GDT BusinessTransactionExecutionStatusCode 38420A, and there is zero or one 38418A PickingExecutionStatusCode 38416A for each ExecutionStatus entity 38406A. The IssueExecutionStatusCode 38422A is of type GDT BusinessTransactionExecutionStatusCode 38426A, and there is zero or one 38424A IssueExecutionStatusCode 38422A for each ExecutionStatus entity 38406A. The PutawayExecutionStatusCode 38428A is of type GDT BusinessTransactionExecutionStatusCode 38432A, and there is zero or one 38430A PutawayExecutionStatusCode 38428A for each ExecutionStatus entity 38406A. The RecipientExecutionStatusCode 38434A is of type GDT BusinessTransactionExecutionStatusCode 38438A, and there is zero or one 38436A RecipientExecutionStatusCode 38434A for each ExecutionStatus entity 38406A.

The ExecutionPeriod entity 38440A includes a PickingPeriod 38444A, an IssuePeriod 38450A, a DeliveryPeriod 38456A, a PutawayPeriod 38462A, and a RecipientPeriod 38468A at the fourth level 38408. The PickingPeriod 38444A is of type GDT DateTimePeriod 38448A, and there is zero or one 38446A PickingPeriod 38444A for each ExecutionPeriod entity 38440A. The IssuePeriod 38450A is of type GDT DateTimePeriod 38454A, and there is zero or one 38452A IssuePeriod 38450A for each ExecutionPeriod entity 38440A. The DeliveryPeriod 38456A is of type GDT DateTimePeriod 38460A, and there is zero or one 38458A DeliveryPeriod 38456A for each ExecutionPeriod entity 38440A. The PutawayPeriod 38462A is of type GDT DateTimePeriod 38466A, and there is zero or one 38464A PutawayPeriod 38462A for each ExecutionPeriod entity 38440A. The RecipientPeriod 38468A is of type GDT DateTimePeriod 38472A, and there is zero or one 38470A RecipientPeriod 38468A for each ExecutionPeriod entity 38440A.

The Party package 38492 includes a ProductRecipientParty entity 38474A, a VendorParty entity 38410B, and a CarrierParty entity 38418B at the third level 38406. The ProductRecipientParty entity 38474A is of type GDT BusinessTransactionDocumentParty 38478A, and there is one 38476A ProductRecipientParty entity 38474A for each Delivery entity 38432. The VendorParty entity 38410B is of type GDT BusinessTransactionDocumentParty 38416B, and there is zero or one 38414B VendorParty entity 38410B for each Delivery entity 38432. The CarrierParty entity 38418B is of type GDT BusinessTransactionDocumentParty 38424B, and there is zero or one 38422B CarrierParty entity 38418B for each Delivery entity 38432.

The ProductRecipientParty entity 38474A includes an InternalID 38480A, an Address 38486A, and a Contact 38492A at the fourth level 38408. The InternalID 38480A is of type GDT PartyInternalID 38484A, and there is zero or one 38482A InternalID 38480A for each ProductRecipientParty entity 38474A. The Address 38486A is of type GDT Address 38490A, and there is zero or one 38488A Address 38486A for each ProductRecipientParty entity 38474A. The Contact 38492A is of type GDT BusinessTransactionDocumentContact 38496A, and there is zero or one 38494A Contact 38492A for each ProductRecipientParty entity 38474A.

The Contact 38492A in ProductRecipientParty entity 38474A includes an InternalID 38498A and an Address 38404B at the fifth level 38410. The InternalID 38498A is of type PartyInternalID 38402B, and there is zero or one 38400B InternalID 38498A for each Contact 38492A. The Address 38404B is of type Address 38408B, and there is zero or one 38406B Address 38404B for each Contact 38492A.

The VendorParty 10B includes the same information as the ProductRecipientParty 38474A, as denoted by ellipses 38412B. Likewise, CarrierParty entity 38418B includes the same information as the ProductRecipientParty 38474A, as denoted by ellipses 38420B.

The Location package 38494 includes a ShipToLocation entity 38426B and a ShipFromLocation entity 38450B at the third level 38406. The ShipToLocation entity 38426B is of type GDT BusinessTransactionDocumentLocation 38430B, and there is one 38428B ShipToLocation entity 38426B for each Delivery entity 38432. The ShipFromLocation entity 38450B is of type GDT BusinessTransactionDocumentLocation 38456B, and there is zero or one 38454B ShipFromLocation entity 38450B for each Delivery entity 38432.

The ShipToLocation entity 38426B includes an InternalID 38432B, an Address 38438B, and a Note 38444B. The InternalID 38432B is of type GDT LocationInternalID 38436B, and there is zero or one 38434B InternalID 38432B for each ShipToLocation entity 38426B. The Address 38438B is of type GDT Address 38442B, and there is zero or one 38440B Address 38438B for each ShipToLocation entity 38426B. The Note 38444B is of type GDT Note 38448B, and there is zero or one 38446B Note 38444B for each ShipToLocation entity 38426B.

The ShipFromLocation entity 38450B contains the same information as the ShipToLocation entity 38426B, as denoted by ellipses 38452B.

The TransportationInformation package 38496 includes a TransportMeans entity 38458B at the third level 38406. The TransportMeans entity 38458B is of type GDT TranportMeans 38462B, and there is zero or one 38460B TransportMeans entity 38458B for each Delivery entity 38432.

The BusinessTransactionDocumentReference package 38498 includes a DespatchedDeliveryReference entity 38464B and a ShipmentReference entity 38470B at the third level 38406. The DespatchedDeliveryReference entity 38464B is of type GDT BusinessTransactionDocumentReference 38468B, and there is zero or one 38466B DespatchedDeliveryReference entity 38464B for each Delivery entity 38432. The ShipmentReference entity 38470B is of type GDT BusinessTransactionDocumentReference 38474B, and there is zero or one 38472B ShipmentReference entity 38470B for each Delivery entity 38432.

The Attachment package 38400A includes an AttachmentWebAddress entity 38476B. The AttachmentWebAddress entity 38476B is of type GDT WebAddress 38480B, and there is any number 38478B of AttachmentWebAddress entities 38476B for each Delivery entity 38432.

The Description package 38402A includes a Description entity 38482B. The Description entity 38482B is of type GDT Description 38486B, and there is any number 38484B of Description entities 38482B for each Delivery entity 38432.

The DeliveryItem package 38404A includes at least one 38490B DeliveryItem entity 38488B at the third level 38406. The DeliveryItem package 38404A also includes an ExecutionInformation package 38468C, a ProductInformation package 38470C, a Batch package 38472C, a BusinessTransactionDocumentReference package 38474C, an Attachment package 38476C, and a Description package 38478C.

The DeliveryItem entity 38488B includes an ID 38492B, a TypeCode 38498B, a CreationDateTime 38404C, a LastChangeDateTime 38410C, a GroupID 38416C, a HierarchyRelationship 38422C, a Quantity 38438C, a SalesOrderQuantity 38444C, a PurchaseOrderQuantity 38450C, an InventoryQuantity 38456C, and a CompletedIndicator 38462C at the fourth level. The ID 38492B is of type GDT BusinessTransactionDocumentItemID 38496B, and there is one 38494B ID 38492B for each DeliveryItem entity 38488B. The TypeCode 38498B is of type GDT BusinessTransactionDocumentItemTypeCode 38402C, and there is zero or one 38400C TypeCode 38498B for each DeliveryItem entity 38488B. The CreationDateTime 38404C is of type GDT DateTime 38408C, and there is one 38406C CreationDateTime 38404C for each DeliveryItem entity 38488B. The LastChangeDateTime 38410C is of type GDT DateTime 38414C, and there is zero or one 38412C LastChangeDateTime 38410C for each DeliveryItem entity 38488B. The GroupID 38416C is of type GDT BusinessTransactionDocumentGroupID 38420C, and there is zero or one 38418C GroupID 38416C for each DeliveryItem entity 38488B. There is zero or one 38424C HierarchyRelationship 38422C for each DeliveryItem entity 38488B. The Quantity 38438C is of type GDT Quantity 38442C, and there is one 38440C Quantity 38438C for each DeliveryItem entity 38488B. The SalesOrderQuantity 38444C is of type GDT Quantity 38448C, and there is zero or one 38446C SalesOrderQuantity 38444C for each DeliveryItem entity 38488B. The PurchaseOrderQuantity 38450C is of type GDT Quantity 38454C, and there is zero or one 38452C PurchaseOrderQuantity 38450C for each DeliveryItem entity 38488B. The InventoryQuantity 38456C is of type GDT Quantity 38460C, and there is zero or one 38458C InventoryQuantity 38456C for each DeliveryItem entity 38488B. The CompletedIndicator 38462C is of type GDT BusinessTransactionCompletedIndicator 38466C, and there is zero or one 38464C CompletedIndicator 38462C for each DeliveryItem entity 38488B.

The HierarchyRelationship 38422C in the DeliveryItem entity 38488B includes a ParentItemID 38426C and a TypeCode 38432C at the fifth level 38410. The ParentItemID 38426C is of type GDT BusinessTransactionDocumentItemID 38430C, and there is zero or one 38428C ParentItemID 38426C for each HierarchyRelationship 38422C. The TypeCode 38432C is of type GDT BusinessTransactionItemHierarchyRelationshipTypeCode 38436C, and there is one 38434C TypeCode 38432C for each HierarchyRelationship 38422C.

The ExecutionInformation package 38468C includes an ExecutionStatus entity 38480C and an ExecutionPeriod entity 38414D at the fourth level 38408. There is zero or one 38482C ExecutionStatus entity 38480C for each DeliveryItem entity 38488B, and zero or one 38416D ExecutionPeriod entity 38414D for each DeliveryItem entity 38488B.

The ExecutionStatus entity 38480C includes a DeliveryExecutionStatusCode 38484C, a PickingExecutionStatusCode 38490C, an IssueExecutionStatusCode 38496C, a PutawayExecutionStatusCode 38402D, and a ReceiptExecutionStatusCode 38408D at the fifth level 38410. The DeliveryExecutionStatusCode 38484C is of type GDT BusinessTransactionExecutionStatusCode 38488C, and there is zero or one 38486C DeliveryExecutionStatusCode 38484C for each ExecutionStatus entity 38480C. The PickingExecutionStatusCode 38490C is of type GDT BusinessTransactionExecutionStatusCode 38494C, and there is zero or one 38492C PickingExecutionStatusCode 38490C for each ExecutionStatus entity 38480C. The IssueExecutionStatusCode 38496C is of type GDT BusinessTransactionExecutionStatusCode 38400D, and there is zero or one 38498C IssueExecutionStatusCode 38496C for each ExecutionStatus entity 38480C. The PutawayExecutionStatusCode 38402D is of type GDT BusinessTransactionExecutionStatusCode 38406D, and there is zero or one 38404D PutawayExecutionStatusCode 38402D for each ExecutionStatus entity 38480C. The ReceiptExecutionStatusCode 38408D is of type GDT BusinessTransactionExecutionStatusCode 38412D, and there is zero or one 38410C ReceiptExecutionStatusCode 38408D for each ExecutionStatus entity 38480C.

The ExecutionPeriod entity 38414D includes a PickingPeriod 38418D, an IssuePeriod 38424D, a DeliveryPeriod 38430D, a PutawayPeriod 38436D, and a ReceiptPeriod 38442D at the fifth level 38410. The PickingPeriod 38418D is of type DateTimePeriod 38422D, and there is zero or one 38420D PickingPeriod 38418D for each ExecutionPeriod entity 38414D. The IssuePeriod 38424D is of type DateTimePeriod 38428D, and there is zero or one 38426D IssuePeriod 38424D for each ExecutionPeriod entity 38414D. The DeliveryPeriod 38430D is of type DateTimePeriod 38434D, and there is zero or one 38432D DeliveryPeriod 38430D for each ExecutionPeriod entity 38414D. The PutawayPeriod 38436D is of type DateTimePeriod 38440D, and there is zero or one 38438D PutawayPeriod 38436D for each ExecutionPeriod entity 38414D. The ReceiptPeriod 38442D is of type DateTimePeriod 38446D, and there is zero or one 38444D ReceiptPeriod 38442D for each ExecutionPeriod entity 38414D.

The ProductInformation package 38470C includes a Product entity 38448D at the fourth level 38408. The Product entity 38448D is of type GDT BusinessTransactionDocumentProduct 38452D, and there is one 38450D Product entity 38448D for each DeliveryItem entity 38488B.

The Product entity 38448D in the ProductInformation package 38470C includes an InternalID 38454D, a StandardID 38460D, a ShipToID 38466D, a ShipFromID 38472D, and a Description 38478D at the fifth level 38410. The InternalID 38454D is of type GDT ProductInternalID 38458D, and there is zero or one 38456D InternalID 38454D for each Product entity 38448 D. The StandardID 38460D is of type GDT ProductStandardID 38464D, and there is zero or one 38462D StandardID 38460D for each Product entity 38448D. The ShipToID 38466D is of type GDT ProductPartyID 38470D, and there is zero or one 38468D ShipToID 38466D for each Product entity 38448D. The ShipFromID 38472D is of type GDT ProductPartyID 38476D, and there is zero or one 38474D ShipFromID 38472D for each Product entity 38448D. The Description 38478D is of type GDT Note 38482D, and there is zero or one 38480D Description 38478D for each Product entity 38448D.

The Batch package 38472C includes a Batch entity 38484D at the fourth level 38408. The Batch entity 38484D is of type GDT Batch 38488D, and there is zero or one 38486C Batch entity 38484D for each DeliveryItem entity 38488B. The Batch entity 38484D includes a BatchID 38490D at the fifth level 38410. The BatchID 38490D is of type GDT BatchID 38494D, and there is zero or one 38492D BatchID 38490D for each Batch entity 38484D.

The BusinessTransactionDocumentReference package 38474C includes a PurchaseOrderReference entity 38496D, a SalesOrderReference entity 38402E, a PendingDeliveryReference entity 38408E, a DespatchedDeliveryNotificationReference entity 38414E and a ShipmentReference entity 38420E at the fourth level 38408. The PurchaseOrderReference entity 38496D is of type GDT BusinessTransactionDocumentReference 38400E, and there is zero or one 38498D PurchaseOrderReference entity 38496D for each DeliveryItem entity 38488B. The SalesOrderReference entity 38402E is of type GDT BusinessTransactionDocumentReference 38406E, and there is zero or one 38404E SalesOrderReference entity 38402E for each DeliveryItem entity 38488B. The PendingDeliveryReference entity 38408E is of type GDT BusinessTransactionDocumentReference 38412E, and there is any number 38410E of PendingDeliveryReference entities 38408E for each DeliveryItem entity 38488B. The DespatchedDeliveryNotificationReference entity 38414E is of type GDT BusinessTransactionDocumentReference 38418E, and there is zero or one 38416E DespatchedDeliveryNotificationReference entity 38414E for each DeliveryItem entity 38488B. The ShipmentReference entity 38420E is of type GDT BusinessTransactionDocumentReference 38424E, and there is zero or one 38422E ShipmentReference entity 38420E for each DeliveryItem entity 38488B.

The Attachment package 38476C includes an AttachmentWebAddress entity 38426E at the fourth level 38408. The AttachmentWebAddress entity 38426E is of type GDT WebAddress 38430E, and there is any number 38428E of AttachmentWebAddress entities 38426E for each DeliveryItem entity 38488B.

The Description package 38478C includes a Description entity 38432E at the fourth level 38408. The Description entity 38432E is of type GDT Description 38436E, and there is any number 38434E of Description entities 38432E for each DeliveryItem entity 38488B.

j) Personnel Time Sheet Information Interface

The "Personnel Time Recording" scenario is the motivating business scenario for the PersonnelTimeSheetInformation interface. The scenario comprises the recording of personnel times and personnel time events, and the transfer of this data to target components. Data can be recorded in a Personnel Time Management system or in a standalone Personnel Time Recording system. In the latter case, data is transferred to Personnel Time Management using the PersonnelTimeSheetInformation interface.

(1) Message Type Personnel Time Sheet Information

PersonnelTimeSheetInformation is a message used to transfer recorded personnel times and personnel time events from a standalone Personnel Time Recording system to Personnel Time Management. The structure of the PersonnelTimeSheetInformation message is described by the message data type PersonnelTimeSheetInformationMessage. This message type corresponds to the Timecard standard of the HR-XML consortium.

(2) Message Choreography

Figure 385:
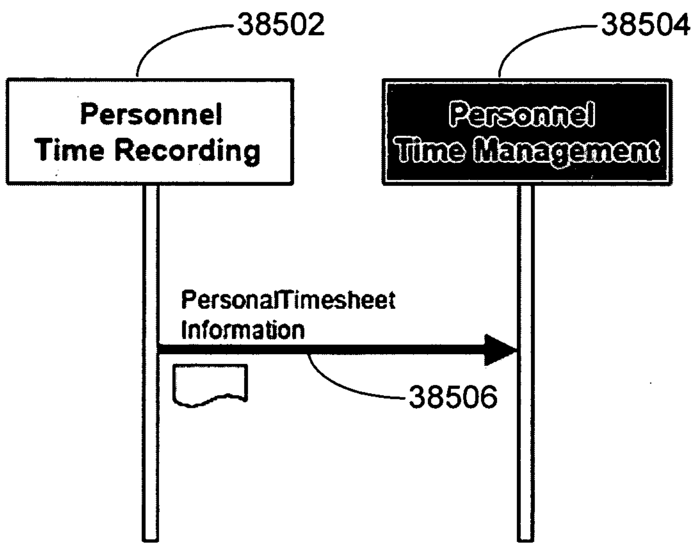
FIG. 385 depicts the example message choreography for the PersonalTimesheetInformation interface established between the PersonnelTimeRecording application and the PersonnelTimeManagement application.

FIG. 385 depicts the Message Choreography for the PersonalTimesheetInformation interface established between the PersonnelTimeRecording application 38502 and the PersonnelTimeManagement application 38504. The PersonnelTimeRecording 38502 sends a PersonnelTimesheetInformation 38506 to the PersonnelTimeManagement application 38504. Personnel Time Recording uses the PersonnelTimeSheetInformation to post the recorded personnel times and personnel time events to Personnel Time Management.

(3) Message Type Personnel Time Sheet Message

Figure 386:
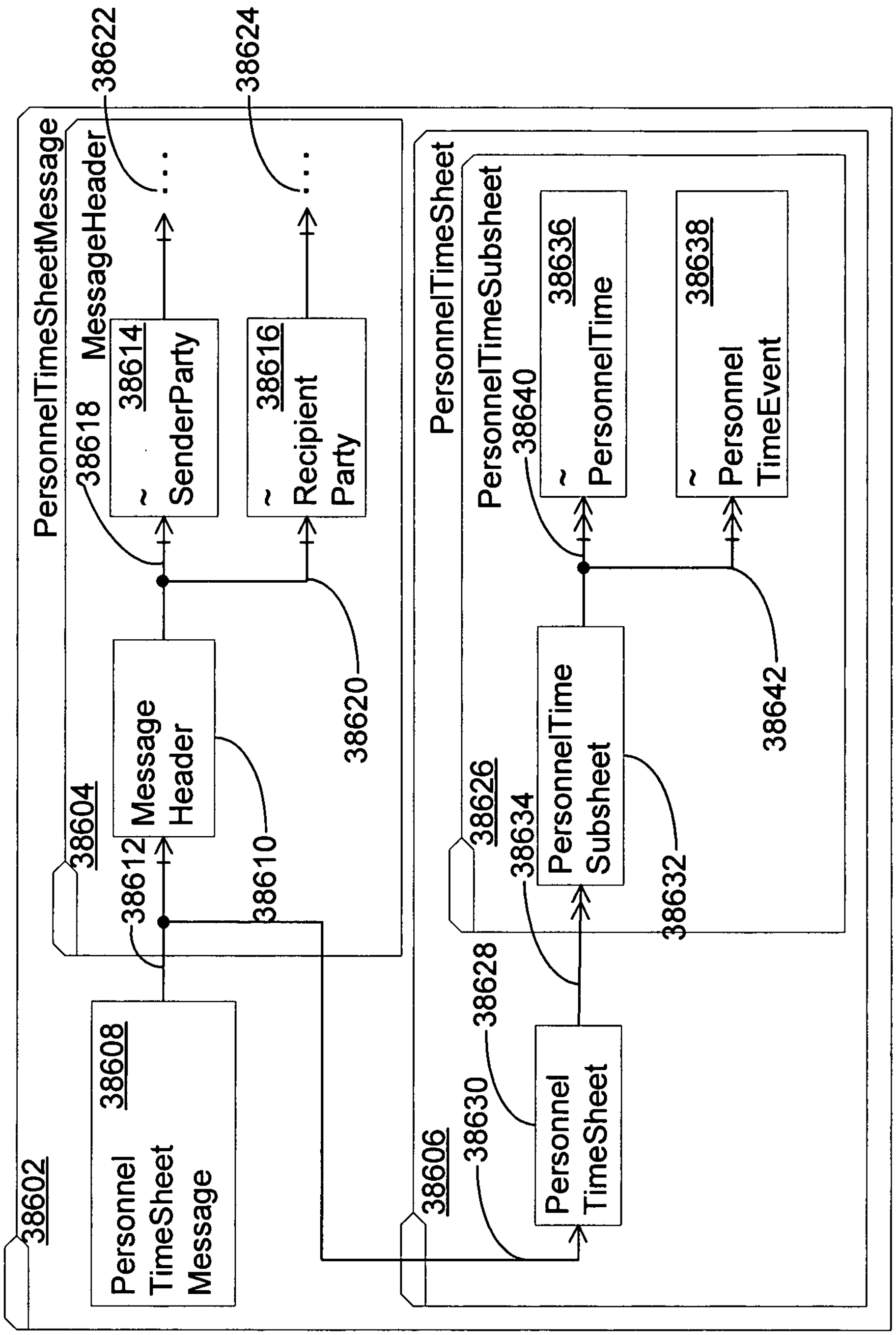
FIG. 386 depicts the data model for the PersonnelTimeSheetMessage message.

The PersonnelTimeSheetMessage shown in FIG. 386 is a message regarding recorded personnel times and personnel time events that is sent to Personnel Time Management. The PersonnelTimeSheetMessage includes a PersonnelTimeSheetMessage package 38602, which includes a MessageHeader package 38604, a PersonnelTimeSheet package 38606, and a PersonnelTimeSheetMessage entity 38608. The PersonnelTimeSheetMessage entity 38608 is of type GDT: PersonnelTimeSheetMessage.

(a) Message Header Package

The MessageHeader Package 38604 groups non-technical, administrative data for a PersonnelTimeSheetMessage. It includes a MessageHeader entity 38610. There is a 1:c relationship 38612 between the PersonnelTimeSheetMessage entity 38608 and the MessageHeader entity 38610.

(i) Message Header

The MessageHeader identifies a set of non-technical, administrative information in a PersonnelTimeSheetMessage. The MessageHeader entity 38610 includes a SenderParty entity 38614 and a RecipientParty entity 38616. There is a 1:c relationship 38618 between the MessageHeader entity 38610 and the SenderParty entity 38614, and a 1:c relationship 38620 between the MessageHeader entity 38610 and the RecipientParty entity 38616.

The MessageHeader entity 38610 also includes a MessageID and a CreationDateTime. The MessageID is the message ID is a unique ID of the BusinessDocument, and is of type GDT:MessageID. The CreationDateTime refers to the time at which the BusinessDocument was created, and is of type GDT:DateTime. The MessageID is typically set by the sending application.

(ii) Sender Party

The SenderParty is the business sender of a message. The SenderParty entity 38614 is of type GDT: BusinessDocumentMessageHeaderParty. The SenderParty entity 38614 can be filled by the sender application to name a contact person for any problems that occur with the message. This is particularly useful if an additional infrastructure, such as a marketplace, is located between the sender and the recipient. The SenderParty entity 38614 may be used to transfer the message and may be ignored by the receiving application. It should be filled by the sender if the PersonnelTimeSheet package is not used to transfer the participating partners. The SenderParty entity 38614 includes the standard information included with parties, as denoted by ellipses 38622.

(iii) Recipient Party

The RecipientParty is the business recipient of a message. The RecipientParty entity 38616 is of type GDT: BusinessDocumentMessageHeaderParty. The RecipientParty entity 38616 can be filled by the sender application to name a contact person for any problems that occur with the message. This is particularly useful if an additional infrastructure, such as a marketplace, is located between the sender and the recipient. The RecipientParty entity 38616 may be used to transfer the message and may be ignored by the receiving application. It should be filled by the sender if the PersonnelTimeSheet package is not used to transfer the participating partners. The RecipientParty entity 38616 includes the standard information included with parties, as denoted by ellipses 38624.

(b) Personnel Time Sheet Package

The PersonnelTimeSheet package 38606 groups together the personnel times or personnel time events recorded for a personnel resource. The PersonnelTimeSheet package 38606 includes a PersonnelTimeSubsheet package 38626 and a PersonnelTimeSheet entity 38628. There is a 1:1 relationship 38630 between the PersonnelTimeSheetMessage entity 38608 and the PersonnelTimeSheet entity 38628.

(i) Personnel Time Sheet

The PersonnelTimeSheet groups together the personnel times or personnel time events recorded for a personnel resource. The PersonnelTimeSheet entity 38628 includes a PersonnelResourceID, which is a unique ID of the personnel resource for which the included personnel times and personnel time events have been recorded. A personnel resource identifies a person or a group of persons (such as a department) that contributes to the execution of services at an enterprise. The PersonnelResourceID is of type GDT: PartyInternalID.

(ii) Personnel Time Subsheet Package

The PersonnelTimeSubsheet package 38626 includes the personnel times and personnel time events recorded for a work agreement. The PersonnelTimeSubsheet package 38626 includes a PersonnelTimeSubsheet entity 38632. There is a 1:n relationship 38634 between the PersonnelTimeSheet entity 38628 and the PersonnelTimeSubsheet entity 38632.

(a) Personnel Time Subsheet

The PersonnelTimeSubsheet is a set of personnel times and personnel time events that have been recorded during a particular period for a personnel resource regarding a work agreement. The PersonnelTimeSubsheet entity 38632 includes a Period and a WorkAgreementID. The Period is the period of the PersonnelTimeSubsheet specifies the period for which personnel times and personnel time events exist, and is of type GDT:DatePeriod. The WorkAgreementID is an ID of the work agreement according to which the personnel times and personnel time events have been recorded. An ID may not be needed if the personnel resource has only one work agreement. In this case, the work agreement can be derived from the resource. A work agreement is an agreement between an employee and an employer. The employee agrees to perform work and the employer agrees to provide remuneration for the work performed. A work agreement comprises numerous other obligations, in addition to the main obligation (remuneration for work), including loyalty, reporting, and benefits. Examples of work agreements include employment contracts, placement contracts, traineeships, and training contracts. The WorkAgreementID is of type GDT:WorkAgreementID.

The PersonnelTimeSubsheet entity 38632 includes a PersonnelTime entity 38636 and a PersonnelTimeEvent entity 38638. There is a 1:cn relationship 38640 between the PersonnelTimeSubsheet entity 38632 and the PersonnelTime entity 38636, and a 1:cn relationship 38642 between the PersonnelTimeSubsheet entity 38632 and the PersonnelTimeEvent entity 38638. The period of each personnel time occurs within the period of the TimeSubsheet. The time of each personnel time event also occurs within this period. In one implementation, at least one PersonnelTime entity 38636 or PersonnelTimeEvent entity 38638 is specified.

(b) Personnel Time

The PersonnelTime is a period of a personnel resource that is characterized by business, pay scale, or legal criteria. The period can be entered as a duration (such as 8 hours on 11/10/2003) or as clock times (such as 8:10 to 17:30 on 11/10/2003). The PersonnelTime entity 38636 is characterized by a personnel time type (such as "working time," "leave," "overtime," "availability for work," "illness" or "work break").

The PersonnelTime entity 38636 includes an ID, a PersonnelTimeTypeID, a DateTimePeriod, a DatePeriod, a Duration, and a EvaluationRelevantDate. The ID is a unique ID for this personnel time. This entry is optional and only exists if the standalone recording system assigns an ID. The ID is of type GDT: PersonnelTimeID. The PersonnelTimeTypeID is the ID for the personnel time type. A personnel time type is a classification of personnel times according to enterprise-specific, pay scale, or legal criteria. Depending on whether the employee is at work or absent, this classification can be made according to payment-relevant or further personnel time management criteria. Examples include "working time," "leave," "overtime, "availability for work," "illness" or "work break." The PersonnelTimeTypeID is of type GDT: PersonnelTimeTypeID. The DateTimePeriod is the period of this personnel time as an interval based on a specific time. This entry is optional. The DateTimePeriod is of type GDT: DateTimePeriod. The DatePeriod is the period of this personnel time as a date. This entry is optional. The DatePeriod is of type GDT: DatePeriod. The Duration is the duration of this personnel time. It specifies the duration between a clock time or date period. Examples (including period) are: "10 hours on 10/01/2003" or "30 minutes between 10 and 11 o'clock on 10/01/2003." If no duration is entered, the duration between the clock times or dates applies. The Duration is of type GDT: Duration. The EvaluationRelevantDate identifies a date that is relevant for the valuation of the personnel time. This entry may be required if, for valuation purposes, a personnel time is to be assigned to a different day than the calendar day to which it currently belongs. For example, to generate a Sunday bonus, a time in the early hours of Monday morning is to be assigned to the previous Sunday. The assignment dictates that other rules are used for the valuation and the results may be assigned to different days. The date for the valuation may need to be entered if the business logic cannot derive this automatically based on the calendar entries. The EvaluationRelevantDate is of type GDT: Date.

In one implementation, a period is specified. The entry can comprise two clock times (GDT DateTimePeriod) or two dates (GDT DatePeriod). If a duration is specified, it may not exceed the period between the clock times or dates.

(c) Personnel Time Event

The PersonnelTimeEvent identifies a change in the execution of services of a personnel resource with which one personnel time ends and another personnel time begins. Such changes can include, for example, the start of work, interruption of work, or end of work. The PersonnelTimeEvent entity 38638 is characterized by a type such as "clock-in entry," "clock-out entry," or "start of break."

The PersonnelTimeEvent entity 38638 includes an ID, a PersonnelTimeEventTypeID, a DateTime, and an EvaluationRelevantDate. The ID is a unique ID for this personnel time event. This entry is optional and exists if the standalone recording system assigns an ID. The ID is of type GDT: PersonnelTimeEventID. The PersonnelTimeEventTypeID is the ID for the type of personnel time event. A personnel time event type is a classification of personnel time events according to personnel time management criteria. A typical criterion is whether the employee is at work or absent. Examples are "clock-in entry," "clock-out entry" or "start of break." The PersonnelTimeEventTypeID is of type GDT: PersonnelTimeEventTypeID. The DateTime is the time at which this personnel time event occurs, and is of type GDT:DateTime. The EvaluationRelevantDate identifies a date to which a personnel time event is assigned for the valuation (see personnel time), and is of type GDT: Date.

(4) Message Data Type Element Structure

FIGS. 387A-C depict the element structure for PersonnelTimesheetMessage. The element structure is similar to the data model, but provides additional information regarding the details of the interface. The element structure identifies the different packages 38700 in the interface, and represents the entities at various levels within the interface. The interface for PersonnelTimesheetMessage includes five levels 38702, 38704, 38706, 38708, and 38710. The element structure identifies the cardinality or occurrence 38714 between the entities or elements, and provides information such as the data type 38714 that provides the basis for the entity or element.

The outermost package of this interface is a PersonnelTimesheetMessage package 38722, which includes a PersonnelTimesheetMessage entity 38724 at the first level 38702. The PersonnelTimesheetMessage entity 38724 is of type GDT PersonnelTimeSheetMessage 38726.

The PersonnelTimesheetMessage package 38722 also includes a MessageHeader package 38734 and a PersonnelTimesheet package 38736. The MessageHeader package 38734 includes a MessageHeader entity 38738, which is of type GDT BusinessDocumentMessageHeader 38742. There is zero or one 38740 MessageHeader entity 38738 for each PersonnelTimesheetMessage entity 38724.

The MessageHeader entity 38738 includes a MessageID 38744 and a CreationDateTime 38754. The MessageID 38744 is of type GDT MessageID 38748, and there is one 38746 MessageID 38744 for each MessageHeader entity 38738. The CreationDateTime 38754 is of type GDT DateTime 38758, and there is one 38756 CreationDateTime 38754 for each MessageHeader entity 38738.

The MessageHeader entity 38738 also includes a SenderParty entity 38766 and a RecipientParty entity 38778. The SenderParty entity 38766 is of type GDT BusinessDocumentMessageHeaderParty 38770, and there is zero or one 38768 SenderParty entity 38766 for each MessageHeader entity 38738. The RecipientParty entity 38778 is of type GDT BusinessDocumentMessageHeaderParty 38782, and there is zero or one 38780 RecipientParty entity 38778 for each MessageHeader entity 38738.

The PersonnelTimesheet package 38736 includes a PersonnelTimesheet entity 38786. There is one 38788 PersonnelTimesheet entity 38786 for each PersonnelTimesheetMessage entity 38724. The PersonnelTimesheet entity 38786 is of type GDT PersonnelTimeSheet 38790. The PersonnelTimesheet entity 38786 includes a PersonnelResourceID 38798. There is one 38700A PersonnelResourceID 38798 for each PersonnelTimesheet entity 38786. The PersonnelResourceID 38798 is of type GDT PartyInternalID 38702A.

The PersonnelTimeSubsheet package 38708A includes a PersonnelTimeSubsheet entity 38710A. There is at least one 38712A PersonnelTimeSubsheet entity 38710A for each PersonnelTimeSheet entity 38786. The PersonnelTimeSubsheet entity 38710A includes a Period 38722A, a WorkAgreementID 38734A, a PersonnelTime 38746A, and PersonnelTimeEvent 38728B. The Period 38722A has one occurrence 38724A, and is of type GDT DatePeriod 38726A. The WorkAgreementID 38734A has one or zero occurrences 38736A, and is of type GDT WorkAgreementID 38738A. The PersonnelTime 38746A has any number of occurrences 38748A, and is of type GDT PersonnelTime 38750A. The PersonnelTimeEvent 38728B has any number of occurrences 38730B, and is of type GDT PersonnelTimeEvent 38732B.

The PersonnelTime 38746A includes an ID 38758A, a TypeID 38768A, a DateTimePeriod 38780A, a DatePeriod 38782A, a Duration 38704B, and a DateForEvaluation 38716B. The ID 38758A has one or zero occurrences 38760A, and is of type GDT PersonnelTimeID 38762A. The TypeID 38768A has one occurrence 38770A, and is of type GDT PersonnelTimeTypeID 38772A. The DateTimePeriod 38780A has one or zero occurrences 38782A, and is of type GDT TimePeriod 38784A. The DataPeriod 38792A has one or zero occurrences 38794A, and is of type GDT DataPeriod 38796A. The Duration 38704B is of type GDT Duration 38708B, and has one or zero occurrences 38706B. The DataForEvaluation 38716B is of type of GDT Date 38720B, and has zero or one occurrences 38718B.

The PersonnelTimeEvent 38728B includes an ID 38740B, a TypeID 38750B, a DateTime 38762B, and a DateForEvaluation 38774B. The ID 38740B has one or zero occurrences 38742B, and is of type GDT PersonnelTimeEventID 38744B. TypeID 38750B has one occurrence 38752B, and is of type GDT PersonnelTimeEventTypeID 38754B. DateTime 38762B has one occurrence 38764B, and is of type GDT DataTime 38766B. DataForEvaluation 38774B has one or zero occurrences 38776B, and is of type GDT Data 38778B.

k) Credit Worthiness Interface

CreditWorthiness interfaces are used to request information about the creditworthiness of a party. The CreditWorthiness interfaces are based on a CreditWorthinessQuery message type and a CreditWorthinessResponse message type. The CreditWorthinessQuery provides the structure for the message requesting the creditworthiness of a party. The CreditWorthinessResponse provides the structure for the reply message that includes the details required about the creditworthiness (score and credit limit) of the party.

The credit management of a company is responsible for checking the creditworthiness of a party and for real-time monitoring of the total liability of parties using dynamic credit limits. The tasks of a credit manager include the final acceptance or refusal of a request (credit decision) and the procurement and management of collateral that reduces the risk of losses on receivables from the party. Creditworthiness checks are carried out using both internal and external information. The information about the creditworthiness can be provided on request from credit management (CreditWorthinessQuery & CreditWorthinessResponse) or as an unsolicited notification to credit management based on internal company rules (CreditWorthinessChangeInformation). Therefore, the bases for the creditworthiness checks include: (1) Credit information about a party provided by information providers (CreditAgencyReportQuery & CreditAgencyReportResponse); (2) information about existing payment obligations of the party, which can be obtained actively by Credit Management (CreditCommitmentQuery & CreditCommitmentResponse) or Credit Management may receive it, for example, from Sales according to internal company rules (CreditCommitmentRecordNotification); and (3) notifications about the payment behavior of parties that Credit Management receives from Payment (CreditPaymentRecordNotification). Credit Management can also provide information internally on request about parties whose creditworthiness is classified as critical (CreditWorthinessCriticalPartiesQuery & CreditWorthinessCriticalPartiesResponse).

The interfaces CreditWorthinessQuery and CreditWorthinessResponse are motivated by the business scenario Credit Check. An application that would request information regarding the creditworthiness of a party (for example, Financials or Sales) sends a query to Credit Management. Credit Management then provides information such as the score and recommended credit limit for the party. This information can, for example, influence the decision as to whether business transactions should take place with this party.

(1) Message Types (a) Credit Worthiness Query

A CreditWorthinessQuery is a query to Credit Management about the creditworthiness of a party. The message type CreditWorthinessQuery is based on the message data type CreditWorthinessQueryMessage.

(b) Credit Worthiness Response

A CreditWorthinessResponse is a response from Credit Management to the query about the creditworthiness of a party. The message type CreditWorthinessResponse is based on the message data type CreditWorthinessMessage.

(2) Message Choreography

Figure 388:
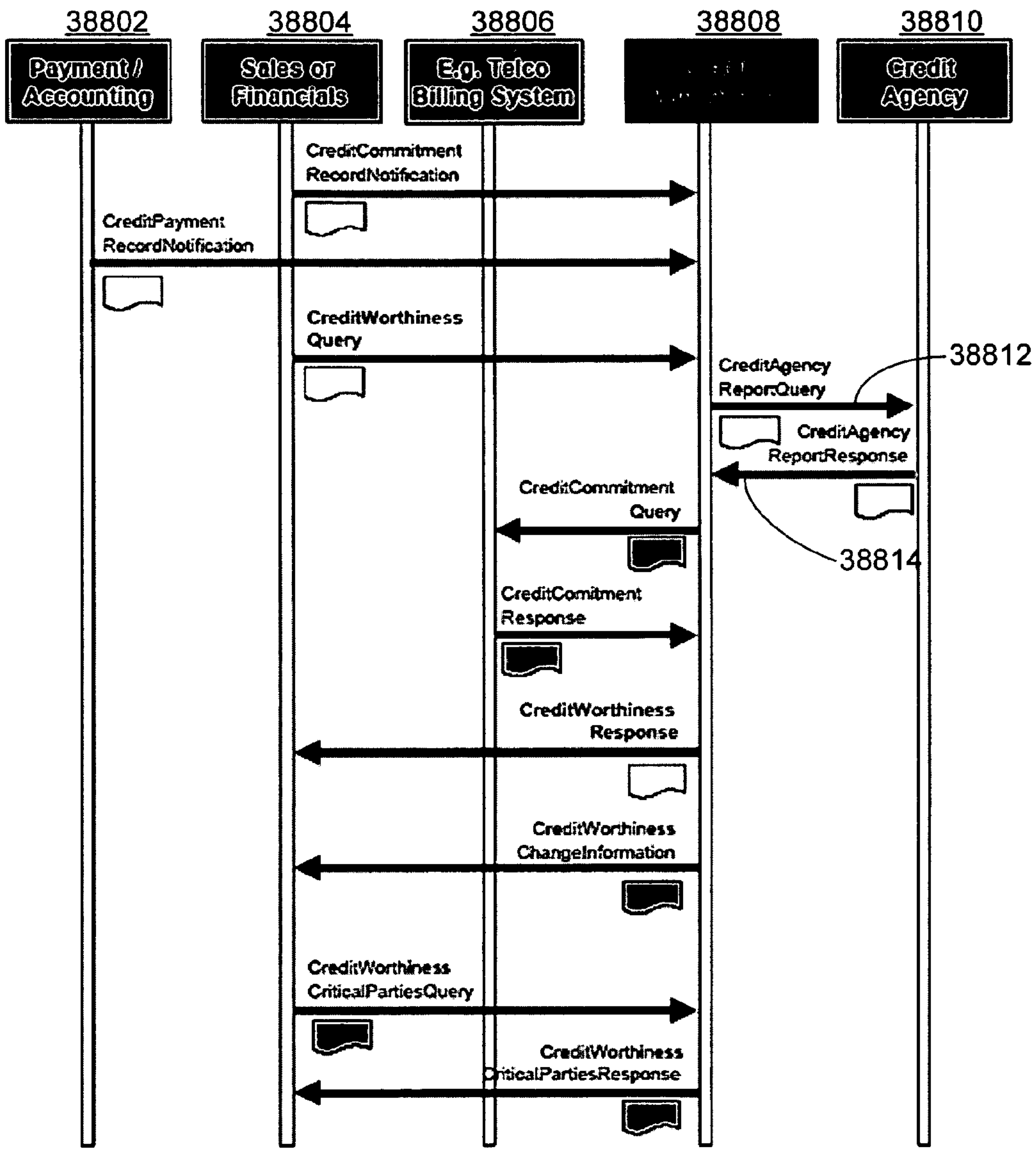
FIG. 388 depicts an example message choreography for the CreditWorthiness interfaces established between five applications: Payment/Accounting, Sales or Financials, Billing System, Credit Management, and Credit Agency.

FIG. 388 depicts the Message Choreography for the CreditWorthiness interfaces established between five applications: Payment/Accounting 38802, Sales or Financials 38804, Billing System 38806, Credit Management 38808, and Credit Agency 38814. For the CreditWorthiness interfaces, Credit Management 38808 sends a CreditAgencyReportQuery to the Credit Agency 38810. In response, the Credit Agency 38810 sends a CreditAgencyReportResponse 38814 to Credit Management 38808. An application that requests information about the creditworthiness of a party (for Payment/Accounting, Sales/Financials, or a Billing system) sends a query (CreditWorthinessQuery) to Credit Management. Credit Management then provides the requested details (CreditWorthinessResponse). A serialization of the messages is not necessary.

(3) Message Data Type Credit Worthiness Query Message

Figure 389:
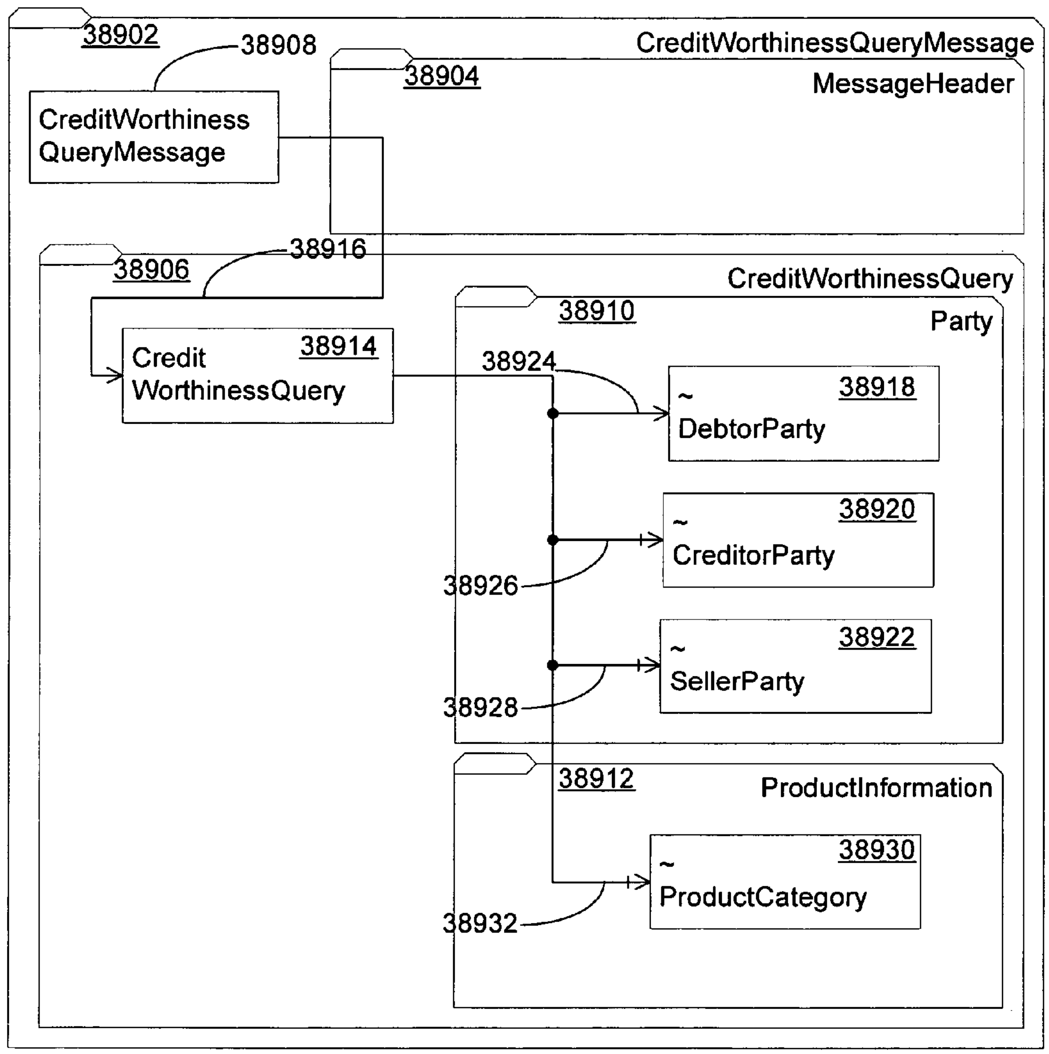

The message data type CreditWorthinessQueryMessage groups the business information that is relevant for sending a business document in a message and the object CreditWorthinessQuery included in the business document. As depicted in FIG. 389, the CreditWorthinessQueryMessage includes a CreditWorthinessQueryMessage package 38902, which includes a MessageHeader package 38904, a CreditWorthinessQuery package 38906, and a CreditWorthinessQueryMessage entity 38908. The message data type CreditWorthinessQueryMessage provides the structure for the message type CreditWorthinessQuery.

(a) Message Header Package

The MessageHeader package 38904 groups the business information that is relevant for sending a business document in a message. The MessageHeader 38904 is optional.

(b) Credit Worthiness Query Package

The CreditWorthinessQuery package 38906 includes a Party package 38910, a Product package 38912, and a CreditWorthinessQuery entity 38914. There is a 1:1 relationship 38916 between the CreditWorthinessQueryMessage entity 38908 and the CreditWorthinessQuery entity 38914.

The CreditWorthinessQuery entity 38914 identifies the query regarding the creditworthiness of a business party, and includes a CreditSegmentInternalID, a CheckedAmount, a CheckingRuleCode, a CheckingSeverityCode, and a CreditAgencyReportRetrievalPermissionIndicator. The CreditSegmentInternalID is the proprietary identifier of the credit segment to which the creditworthiness query relates. The credit segment is a unit of the business of a company from the viewpoint of credit assignment and credit control. One of the uses of the credit segment is to monitor the credit limits of parties. CreditSegmentInternalID is of type GDT: CreditSegmentInternalID. The CheckedAmount is the amount to be checked (for example, order value), and is of type GDT: Amount. The CheckingRuleCode is an encoded representation of the procedure to be used for determining the creditworthiness, and is of type GDT: CreditWorthinessCheckingRuleCode. The CheckingSeverityCode is an encoded representation of the strength of the check procedure to be applied, and is of type GDT: CreditWorthinessCheckingSeverityCode. The CreditAgencyReportRetrievalPermissionIndicator is the specification of whether the party has given consent for credit information to be obtained about him or her, and is of type GDT: CreditAgencyReportRetrievalPermissionIndicator.

These elements can be used to make the creditworthiness query more precise. The CreditSegmentInternalID is used when both the sender and the recipient can access shared master data for the credit segment. If this is not the case, the credit segment is derived from other elements (for example, the CreditorParty, the SellerParty, or the ProductCategory, discussed below).

(i) Credit Worthiness Query Party Package

The CreditWorthinessQueryParty package 38910 includes a DebtorParty entity 38918, a CreditorParty entity 38920, and a SellerParty entity 38922. There is a 1:1 relationship 38924 between the CreditWorthinessQuery entity 38914 and the DebtorParty entity 38918. There is a 1:c relationship 38926 between the CreditWorthinessQuery entity 38914 and the CreditParty entity 38920. There is also a 1:c relationship 38928 between the CreditWorthinessQuery entity 38914 and the SellerParty entity 38922.

The DebtorParty identifies the party about whom creditworthiness information is to be provided, i.e., the debtor party. The DebtorParty entity 38918 is of type GDT BusinessTransactionDocumentParty, where only the element InternalID is used. The DebtorParty entity 38918 is typically specified.

The CreditorParty identifies the party that owns a receivable due from the debtor party. The CreditorParty entity 38920 is of type GDT BusinessTransactionDocumentParty, where, in one implementation, the element InternalID is used. The CreditorParty entity 38920 determines the credit segment and is not required if the credit segment is specified via the CreditSegmentInternalID or determined from the ProductCategory.

The SellerParty identifies the party that sells a product, or plans to, to the debtor party. The SellerParty entity 38922 is of type GDT BusinessTransactionDocumentParty, where, in one implementation, only the element InternalID is used. The SellerParty entity 38922 determines the credit segment and is not required if the credit segment is specified via the CreditSegmentInternalID or determined from the ProductCategory.

(ii) Credit Worthiness Query Product Information Package

The CreditWorthinessQueryProductInformation package 38912 includes a ProductCategory entity 38930. There is a 1:c relationship 38932 between the CreditWorthinessQuery entity 38914 and the ProductCategory entity 38930. The ProductCategory identifies the product category of the product sold to, or to be sold to, the debtor party. The ProductCategory entity 38930 is of type GDT BusinessTransactionDocumentProductCategory, where, in one implementation, only the element InternalID is used. The ProductCategory entity 38930 determines the credit segment and is not required if the credit segment is specified via the CreditSegmentInternalID or determined using the CreditorParty 38920 or SellerParty 38922.

(4) Message Data Type Credit Worthiness Message

The message data type CreditWorthinessMessage groups the business information that is relevant for sending a business document in a message and the object CreditWorthiness included in the business document. It includes a CreditWorthinessMessage package 39002, which includes a MessageHeader package 39004, a CreditWorthinessQuery package 39006, and a CreditWorthinessMessage entity 39008. The message data type CreditWorthinessQueryMessage provides the structure for the message type CreditWorthinessQuery.

(a) Message Header Package

A MessageHeader package 39004 groups the business information that is relevant for sending a business document in a message. The MessageHeader 39004 is optional.

(b) Credit Worthiness Package

Figure 390:
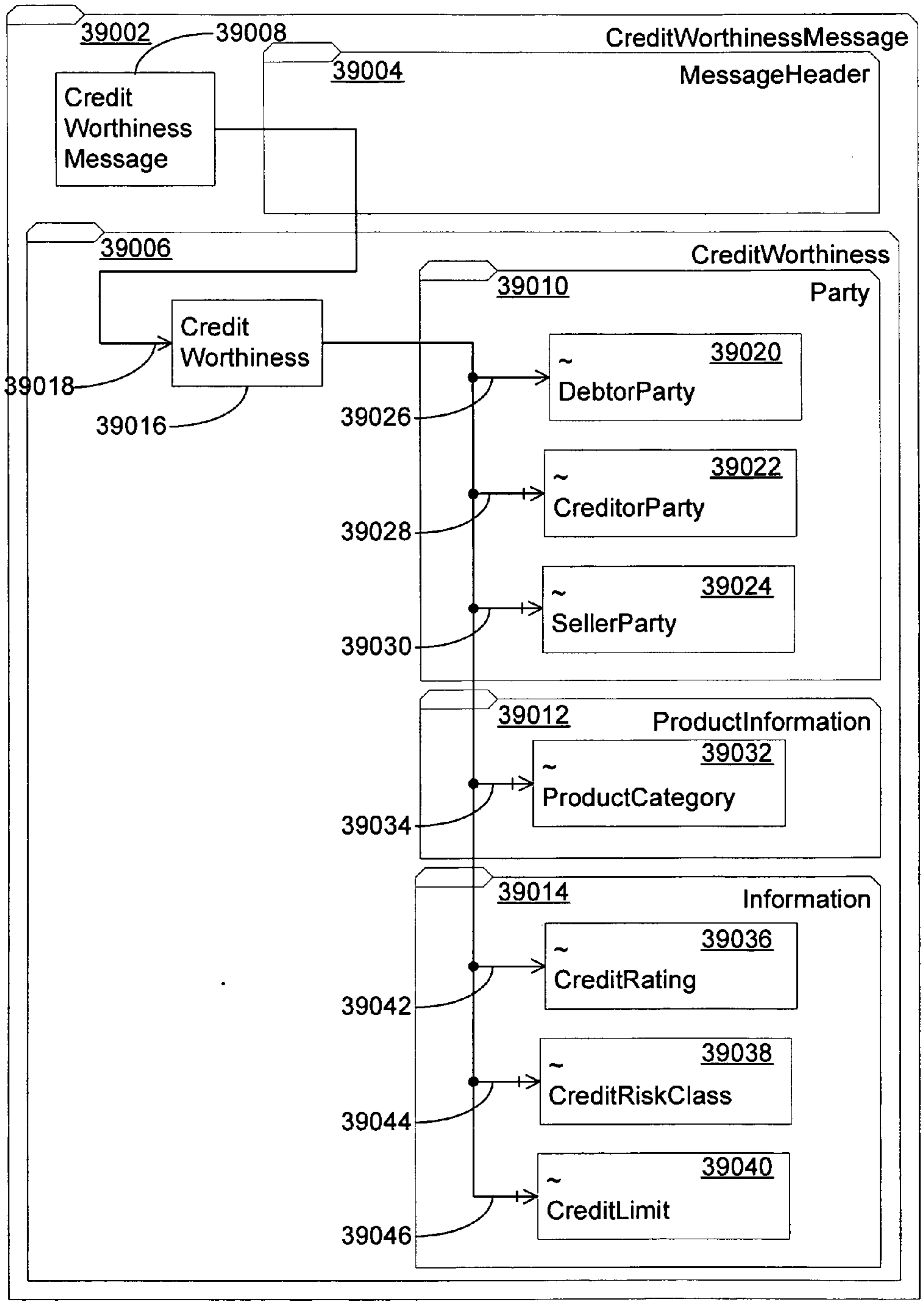

The CreditWorthiness package 39006 shown in FIG. 390 includes a Party package 39010, a ProductInformation package 39012, an Information package 39014, and a CreditWorthiness entity 39016. There is a 1:1 relationship 39018 between the CreditWorthinessMessage entity 39008 and the CreditWorthiness entity 39016.

The CreditWorthiness 16 identifies the creditworthiness of a party, and includes details of the score, risk class, and credit limit, if required. The CreditWorthiness entity 39016 includes an Indicator, a CheckingDescription, and a CreditSegmentInternalID. The Indicator specifies whether the creditworthiness of the party exists for the query parameters, and is of type GDT: CreditWorthinessIndicator. The CheckingDescription includes a description of the process of the creditworthiness check, and is of type GDT:Description. The CheckingDescription is optional. The CreditSegmentInternalID is the proprietary identifier of the credit segment for which the creditworthiness check is carried out. A credit segment is a unit of the business of a company from the viewpoint of credit assignment and credit control. One of the uses of a credit segment is to monitor the credit limits of parties. The CreditSegmentInternalID is of type GDT: CreditSegmentInternalID.

The CreditSegmentInternalID is used when both the sender and the recipient can access shared master data for the credit segment. If this is not the case, the credit segment is derived from other elements (for example, CreditorParty, SellerParty, or ProductCategory). The most important information about the creditworthiness of a party is retained in the element CreditWorthinessIndicator and in the entity Rating in the CreditWorthinessInformation package.

(i) Credit Worthiness Party Package

The CreditWorthinessParty package 39010 includes a DebtorParty entity 39020, a CreditorParty entity 39022, and a SellerParty entity 39024. There is a 1:1 relationship 39026 between the CreditWorthiness entity 39016 and the DebtorParty entity 39020. There is a 1:c relationship 39028 between the CreditWorthiness entity 39016 and the CreditorParty entity 39022. There is also a 1:c relationship 39030 between the CreditWorthiness entity 39016 and the SellerParty entity 39024.

The DebtorParty identifies the party whose creditworthiness was determined (i.e., the Debtor Party). The DebtorParty entity 39020 is of type GDT BusinessTransactionDocumentParty; where only the element InternalID is used. The Debtor Party is typically specified.

The CreditorParty identifies the party that owns a receivable due from the Debtor Party. The CreditorParty entity 39022 is of type GDT BusinessTransactionDocumentParty; where the element InternalID is used. Parties that are assigned to the credit segment in which the creditworthiness was determined are typically specified.

The SellerParty identifies a party that can sell a product to a Debtor Party. The SellerParty entity 39024 is of type GDT BusinessTransactionDocumentParty; where, in one implementation, the element InternalID is used. Parties that are assigned to the credit segment in which the creditworthiness was determined are specified.

(ii) Credit Worthiness Query Product Information Package

The CreditWorthinessQueryProductInformation package 39012 includes a ProductCategory entity 39032, which identifies the product category of the product sold to, or to be sold to, the Debtor Party. There is a 1:c relationship 39034 between the CreditWorthiness entity 39016 and the ProductCategory entity 39032.

The ProductCategory entity 39032 is of type GDT BusinessTransactionDocumentProductCategory; where, in one implementation, the element InternalID is used. Product categories that are assigned to the credit segment in which the creditworthiness was determined are specified.

(iii) Credit Worthiness Information Package

The CreditWorthinessInformation package 39014 includes a summary of details of the creditworthiness determined for a party, and includes a CreditRating entity 39036, a CreditRiskClass entity 39038, and a CreditLimit entity 39040. There is a 1:1 relationship 39042 between the CreditWorthiness entity 39016 and the CreditRating entity 39036. There is a 1:c relationship 39044 between the CreditWorthiness entity 39016 and the CreditRiskClass entity 39038. There is also a 1:c relationship 39046 between the CreditWorthiness entity 39016 and the CreditLimit entity 39040.

The CreditRating identifies the score of a business party determined by Credit Management, which is valid for a specific period. The CreditRating entity 39036 includes a Code and a ValidityPeriod. The Code is the encoded representation of the score value, and is of type GDT: CreditRatingCode. The ValidityPeriod is the validity period for the credit score, and is of type GDT: DateTimePeriod, where the element "Duration" is not used. Credit Management provides the list of possible CreditRatingCodes. "CreditRating" and "Rating" are used interchangeably.

The CreditRiskClass identifies the risk of non-payment determined by Credit Management, which is valid for a specific period, and may be linked to a business contract. The CreditRiskClass entity 39038 includes a RiskClass and a ValidityPeriod. The RiskClass is the encoded representation of the risk class, and is of type GDT: CreditRiskClassCode. The ValidityPeriod is the validity period for the credit risk class, and is of type GDT: DateTimePeriod, where the element "Duration" is not used. Credit Management provides the list of CreditRiskClassCodes. "CreditRiskClass" and "RiskClass" are used interchangeably.

The CreditLimit identifies the credit limit valid for a business party for a specific period. The CreditLimit entity 39040 includes an Amount and a ValidityPeriod. The Amount is the amount of the credit limit, and is of type GDT: Amount. The ValidityPeriod is the validity period for the credit limit, and is of type GDT: DateTimePeriod, where the element "Duration" is not used.

(5) Message Data Type Element Structure (a) CreditWorthiness Query

FIGS. 391A-B depict the element structure for CreditWorthinessQuery. The element structure is similar to the data model, but provides additional information regarding the details of the interface. The element structure identifies the different packages 39100 in the interface, and represents the entities at various levels within the interface. As depicted in FIGS. 391A-B, the interface for CreditWorthinessQuery includes four levels 39102, 39104, 39106, and 39108. The element structure identifies the cardinality or occurrence 39110 between the entities of the interface, and provides information such as the data type 39112 that provides the basis for the entity or element. The outermost package 39100 of this interface is an CreditWorthinessQueryMessage package 39114, which includes a CreditWorthinessQueryMessage entity 39116 at the first level 39102. The CreditWorthinessQueryMessage entity 39116 is of type message data type ("MDT") 391 CreditWorthinessQueryMessage 39118.

The CreditWorthinessQueryMessage package 39114 includes a CreditWorthinessQuery package 39120. The CreditWorthinessQuery package 39120 includes a CreditWorthinessQuery entity 39122. There is one 39124 CreditWorthinessQuery entity 39122 for each CreditWorthinessQueryMessage entity 39116. The CreditWorthinessQuery entity 39122 is of type AGDT CreditWorthinessQuery 39126. The CreditWorthinessQuery entity 39122 includes a CreditSegmentInternalID 39128, a CheckedAmount 39134, a CheckingRuleCode 39140, a CheckingSeverityCode 39146, and a CreditAgencyReportRetrievalPermissionIndicator 39152.

There is zero or one 39130 CreditSegmentInternalID 39128 for each CreditWorthinessQuery entity 39122. The CreditSegmentInternalID 39128 is of type GDT CreditSegmentInternalID 39132. A CheckedAmount 39134 has zero or one occurrences 39136 for each CreditWorthinessQuery entity 39122, and is of type GDT Amount 39138. CheckingRuleCode 39140 has zero or one occurrences 39142 for each CreditWorthinessQuery entity 39122, and is of type GDT CreditWorthinessCheckingRuleCode 39144. CheckingSeverityCode 39146 has zero or one occurrences 39148 for each CreditWorthinessQuery entity 39122, and is of type GDT CreditWorthinessSeverityCode 39150. CreditAgencyReportRetrievalPermissionIndicator 39152 has one occurrence 39154 for each CreditWorthinessQuery entity 39122, and is of type GDT CreditAgencyReportRetrievalPermissionIndicator 39156.

The CreditWorthinessQuery package 39120 also includes a Party package 39158 and a ProductInformation package 39160. The Party package 39158 includes a DebtorParty entity 39162, a CreditorParty entity 39174, and a SellerParty entity 39186. The DebtorParty entity 39162 is of type GDT BusinessTransactionDocumentParty 39166. There is one 39164 DebtorParty entity 39162 for each CreditWorthinessQuery entity 39122. The CreditorParty entity 39174 is of type GDT BusinessTransactionDocumentParty 39178. There is zero or one 39176 CreditorParty entity 39174 for each CreditWorthinessQuery entity 39122. The SellerParty entity 39186 is of type GDT BusinessTransactionDocumentParty 39190. There is zero or one 39188 SellerParty entity 39186 for each CreditWorthinessQuery entity 39122. The DebtorParty entity 39162 includes an InternalID 39168 that has one 39170 occurrence for each DebtorParty entity 39162, and is of type GDT PartyInternalID 39172. The CreditorParty entity 39174 includes an InternalID 39180 that has one 39182 occurrence for each CreditorParty entity 39174, and is of type GDT PartyInternalID 39184. The SellerParty entity 39186 includes an InternalID 39192 that has one 39194 occurrence for each SellerParty entity 39186, and is of type GDT PartyInternalID 39190.

The ProductInformation package 39160 includes a ProductCategory entity 39198. The ProductCategory entity 39198 is of type GDT BusinessTransactionDocumentProductCategory 39102A. There is zero or one 39100A ProductCategory entity 39198 for each CreditWorthinessQuery entity 39122. The ProductCategory entity 391.98 includes an InternalID 39104A having one 39106A occurrence for each ProductCategory entity 39198, and a data type of GDT ProductCategoryInternalID 39108A.

(b) CreditWorthiness Response

FIGS. 392A-C depict the element structure for CreditWorthinessResponse. The element structure is similar to the data model, but provides additional information regarding the details of the interface. The element structure identifies the different packages 39200 in the interface, and represents the entities at various levels within the interface. As depicted in FIGS. 392A-C, the interface for CreditWorthinessResponse includes four levels 39202, 39204, 39206, and 39208. The element structure identifies the cardinality or occurrence 39210 between the entities and/or elements of the interface, and provides information such as the data type 39212 that provides the basis for the entity or element. The outermost package of this interface is a CreditWorthinessMessage package 39214, which includes an CreditWorthinessMessage entity 39216 at the first level 39202. The CreditWorthiness- Message entity 39216 is of type message data type ("MDT") CreditWorthinessMessage 39218.

The CreditWorthinessMessage package 39214 includes a CreditWorthiness package 39220. The CreditWorthiness package 39220 includes a CreditWorthiness entity 39222, a Party package 39246, a Product Information package 39248, and a CreditworthinessInformation package 39250. There is one 39224 CreditWorthiness entity 39222 for each CreditWorthinessMessage entity 39216. The CreditWorthiness entity 39222 is of type AGDT CreditWorthiness 39226. The CreditWorthiness entity 39222 includes a CreditSegmentInternalID 39228, an Indicator 39234, and a CheckingDescription 39240.

There is zero or one 39230 CreditSegmentInternalID 39228 for each CreditWorthiness entity 39222. The CreditSegmentInternalID 39228 is of type GDT CreditSegmentInternalID 39232. An Indicator 39234 has zero or one 39236 occurrences for each CreditWorthiness entity 39222, and is of type GDT CreditWorthinessIndicator 39238. CheckingDescription 39240 has any number of occurrences 39242, and is of type GDT Description 39244.

The Party package 39246 includes a DebtorParty entity 39252, a CreditorParty entity 39264, and a SellerParty entity 39276. The DebtorParty entity 39252 is of type GDT BusinessTransactionDocumentParty 39256. There is one 39254 DebtorParty entity 39252 for each CreditWorthiness entity 39222. The CreditorParty entity 39264 is of type GDT BusinessTransactionDocumentParty 39268. There is any number of occurrances 39266 of the CreditorParty 39264 for each CreditWorthiness entity 39222. The SellerParty entity 39276 is of type GDT BusinessTransactionDocumentParty 39280. There is any number of occurrences 39278 of the SellerParty entity 39276 for each CreditWorthiness entity 39222. The DebtorParty entity 39252 includes an InternalID 39258 that has one 39260 occurrence for each DebtorParty entity 39252. The InternalID 39258 is of type GDT PartyInternalID 39262. The CreditorParty entity 39264 includes an InternalID 39270 that has one 39272 occurrence for each CreditorParty entity 39264. The InternalID 39270 is of type GDT PartyInternalID 39274. The SellerParty entity 39276 includes an InternalID 39282 that has one 39284 occurrence for each SellerParty entity 39276. The InternalID 39282 is of type GDT PartyInternalID 39286.

The ProductInformation package 39248 includes a ProductCategory entity 39288. The ProductCategory entity 39288 is of type GDT BusinessTransactionDocumentProductCategory 39292. There is any number of occurrances 39290 of ProductCategory entities 39288 for each CreditWorthiness entity 39222. The ProductCategory entity 39288 includes an InternalID 39294 having one 39296 occurrence. The InternalID 39294 is of type GDT ProductCategoryInternalID 39298.

The CreditworthinessInformation package 39250 includes a CreditRating 39200A, CreditRiskClass 39216A, and CreditLimit 39232A. The CreditRating 39200A has one 39202A occurrence and includes a Code 39204A and a Validity Period 39210A. The Code 39204A has one occurrence 39206A for each CreditRating 39200A, and is of type GDT CreditRatingCode 39208A. The ValidityPeriod 39210A has one or zero occurrences 39212A for each CreditRating 39200A, and is of type GDT DateTimePeriod 39214A. The CreditRiskClass entity 39216A has one or zero occurrences 39218A and includes a Code 39220A and a Validity Period 39226A. The Code 39220A has one occurrence 22A, and is of type GDT CreditRiskClassCode 39224A. The ValidityPeriod 39226A has one or zero occurrences 28A, and is of type GDT DateTimePeriod 39230A. The CreditLimit entity 39232A has one or zero occurrences 39234A, and includes an Amount 39236A and a ValidityPeriod 39242A. The Amount 39236A has one occurrence 39238A for each CreditLimit entity 39232A, and is of type GDT Amount 39240A. The ValidityPeriod 39242A has one or zero occurrences 39244A, and is of type GDT DateTimePeriod 39246A.

1) Credit Agency Report Interfaces

CreditAgencyReport interfaces are used to request credit information about a party from a credit agency. An agency provides business information about private or business relationships of other parties, particularly with regard to their creditworthiness (for example, Dun & Bradstreet or Schufa). With the information received about the creditworthiness assessment, about payment reliability, and other financial information, a company can then determine a creditworthiness score for the party. The CreditAgencyReport interfaces are based on two message types: (1) the CreditAgencyReportQuery structures the message for requesting credit information; and (2) the CreditAgencyReportResponse structures the response message that includes the required credit information.

In a company, credit management is responsible for checking the creditworthiness of parties and for real-time monitoring of the total liability of parties using dynamic credit limits. The tasks of a credit manager include the final acceptance or refusal of requests (credit decision) and the procurement and management of collateral that reduces the risk of losses on receivables from parties. Creditworthiness checks are carried out using both internal and external information. The information about the creditworthiness can be provided on request from credit management (CreditWorthinessQuery & CreditWorthinessResponse) or as an unsolicited notification to credit management based on internal company rules (CreditWorthinessChangeInformation).

Creditworthiness checks therefore are based on: (1) credit information about parties provided by information providers (CreditAgencyReportQuery & CreditAgencyReportResponse); (2) information about existing payment obligations of the party; this information can be obtained actively by Credit Management (CreditCommitmentQuery & CreditCommitmentResponse) or Credit Management receives it, for example, from Sales according to internal company rules (CreditCommitmentRecordNotification); and (3) notifications about the payment behavior of parties that Credit Management receives from Payment (CreditPaymentRecordNotification). Credit Management also can provide information internally on request about parties whose creditworthiness is classified as critical (CreditWorthinessCriticalPartiesQuery & CreditWorthinessCriticalPartiesResponse).

Credit Management sends a query about a party to the Web server of an agency; the agency determines the information required (for example, based on industry, size of company) and returns it. This information is processed further in the "Credit Rules Engine." A score and an internal credit limit are determined as the result of a series of flexible rules that are based on a company's own experience with the party and the creditworthiness data from the agency.

(1) Message Types (a) Credit Agency Report Query

The CreditAgencyReportQuery is an inquiry to a credit agency for credit information about a party. The message type CreditAgencyReportQuery is based on the message data type CreditAgencyReportQueryMessage. The B2B CreditAgencyReportQuery is transformed into the query format of the respective credit agency within the Exchange Infrastructure.

(b) Credit Agency Report Response

The CreditAgencyReportResponse is the response from a credit agency to the inquiry for credit information about a party. The message type CreditAgencyReportResponse is based on the message data type CreditAgencyReportMessage. The response message of the credit agency is transformed into the format of the B2B CreditAgencyReportResponse within the Exchange Infrastructure.

(2) Message Choreography

FIG. 393 depicts the message choreography for an exemplary credit agency report and query process. The choreography involves two business entities: a CreditManagement entity of a company 39302 and a CreditManagement entity 39304, which may be an agency separate from the company. The CreditManagement entity 39302 may periodically receive notifications from other departments of the company, e.g., Payment/Accounting 39306, Sales/Financials 39308, or Billing Systems 39310, about the existing payment obligations of parties or about payments received from these parties. The CreditManagement entity 39302 uses this information to answer queries from various company areas about the creditworthiness of parties, taking into account, in some circumstances, credit information from external credit agencies and querying current payment obligations. CreditManagement 39302 may also actively provide information about changes to the creditworthiness of parties or, on request, name parties whose creditworthiness is classified as critical.

As shown in FIG. 393, the CreditManagement entity 39302 sends a CreditAgencyReportQuery 39314 to the CreditAgency entity 39304 based on payment obligations of parties or about payments received from these parties received from the other company department. In response, the CreditAgency entity 39304 sends a CreditAgencyReportResponse 39316 to the CreditManagement entity 39302. In one implementation, the transmission of the messages takes place synchronously. Serialization of the message is not necessary.

(3) Message Data Type Credit Agency Report Query Message

FIG. 394 depicts the data model for the MessageDataTypeCreditAgencyReportQueryMessage used to implement a CreditAgencyReportQuery message 39314. The message data type CreditAgencyReportQueryMessage groups the business information that is relevant for sending a business document in a message and the object CreditAgencyReportQuery included in the business document. The message data type CreditAgencyReportQueryMessage includes a CreditAgencyReportQueryMessage package 39400. The CreditAgencyReportQueryMessage package 39400 includes a MessageHeader package 39402, a CreditAgencyReportQueryPackage 39404, and a CreditAgencyReportQueryMessage entity 39406.

(a) Message Header Package

The MessageHeader package 39402 groups the business information that is relevant for sending a business document in a message. The MessageHeader 39402 package includes a MessageHeader entity 39408, a SenderParty entity 39410 and a RecipientParty entity 39412. The MessageHeader entity 39408 groups business information from the viewpoint of the sending application to identify the business document in a message, information about the sender, and information about the recipient. The MessageHeader entity 39408 is of the type GDT: BusinessDocumentMessageHeader. There is a 1:c relationship 39414 between the CreditAgencyReportQueryMessage entity 39406 and the MessageHeader entity 39408. There is a 1:c relationship 39416 between the MessageHeader entity 39408 and the SenderParty entity 39410. There is a 1:cn relationship 39418 between the MessageHeader entity 39408 and the RecipientParty entity 39412.

The MessageHeader entity 39408 includes an ID and a CreationDateTime. The ID is a unique identifier for the message, and is of type GDT: MessageID. The CreationDateTime is the creation date and time of the message, and is of type GDT: DateTime The SenderParty entity 39410 identifies the party responsible for sending a business document at the business application level. The SenderParty entity 39410 is of type GDT: BusinessDocumentMessageHeaderParty. Only the InternalID of the data type is used.

The RecipientParty entity 39412 identifies the party responsible for receiving a business document at the business application level. The RecipientParty entity 39412 is of type GDT: BusinessDocumentMessageHeaderParty and may include an InternalID of type GDT: Party Internal ID.

(b) Credit Agency Report Query Package

The CreditAgencyReportQuery Package 39404 includes a CreditAgencyReportQueryParty or Party package 39420, a CreditAgencyReportQueryService or service package 39422, and a CreditAgencyReportQuery entity 39424. The CreditAgencyReportQuery entity 39424 identifies the query to a credit agency for credit information about a party. The CreditAgencyReportQuery entity 39424 includes details about the party for whom credit information is required, together with a specification of the service required by the agency. The CreditAgencyReportQuery entity 39424 includes a ReasonCode, which is a reason for the query to the credit agency, and is of type GDT: CreditAgencyReportQueryReasonCode. There is a 1:1 relationship 39426 between the CreditAgencyReportQueryMessage entity 39406 and the CreditAgencyReportQuery entity 39424.

(i) Credit Agency Report Query Party Package

The CreditAgencyReportQueryParty Package 39420 includes a DebtorParty entity 39428, which identifies the party about whom credit information is to be provided. There is a 1:1 relationship 39430 between the CreditAgencyReportQuery entity 39424 and the DebtorParty entity 39428. The DebtorParty entity 39428 includes a StandardID, a CreditAgencyID, an Address, an IncorporationDate, and a BirthDate. The StandardID is the standardized identifier of the party to be checked, and is of type GDT: PartyStandardID. The CreditAgencyID is the identifier given by the credit agency for the party to be checked, and is of type GDT: PartyPartyID. The Address is the address of the party to be checked, and is of type GDT: Address, where FunctionalTitleName, DepartmentName, Office, TaxJurisdictionCode, TimeZoneDifferenceValue, and GeoCoordinates need not be used. The IncorporationDate is the incorporation date of a company, if the party to be checked is a company, and is of type GDT: Date. The BirthDate is the date of birth of a natural person, if the party to be checked is a natural person, and is of type GDT: Date. The elements IncorporationDate and BirthDate need not be used together.

As many details as possible are given about a party so that it can be uniquely identified by the credit agency. Data protection considerations are pushed into the background because, firstly, the party has given consent for credit information to be obtained, and secondly, the credit agency is obliged to handle data transmitted confidentially. In addition, it is part of the service in some credit agencies (for example, Schufa) to check the details of a party (address, bank details, credit card number, and so on).

(c) Credit Agency Report Query Service Package

The CreditAgencyReportQueryService package 39422 includes a summary of all information about the type and scope of the service required from the credit agency, and includes a Service entity 39432, which specifies the type and scope of the service required from the credit agency. There is a 1:1 relationship 39434 between the CreditAgencyReportQuery entity 39424 and the Service entity 39422. The Service entity 39422 includes a CreditAgencyID and a LanguageCode. The CreditAgencyID is the identifier provided by the credit agency for the service required (according to the agency service catalog), and is of type GDT: ProductPartyID. The LanguageCode is the language in which the results of the service required are to be provided, and is of type GDT: LanguageCode.

(4) Message Data Type Credit Agency Report Message

FIGS. 395A and B depict the data model for a message data type CreditAgencyReportResponse used to implement a CreditAgencyReportResponse message 39316. The message data type CreditAgencyReportResponse includes a CreditAgencyReportMessage package 39500. The CreditAgencyReportMessage package 39500 groups the business information that is relevant for sending a business document in a message and the object CreditAgencyReport included in the business document. The CreditAgencyReportMessage package 39500 includes a MessageHeader package 39502, a CreditAgencyReport package 39504, and a CreditAgencyReportMessage entity 39506.

(a) Message Header Package

The MessageHeader package 39502 groups the business information that is relevant for sending a business document in a message. It includes a MessageHeader entity 39508, which groups together the business information from the point of view of the sending application to identify the business document in a message, information about the sender, and information about the recipient. There is a 1:c relationship 39510 between the MessageHeader entity 39508 and the CreditAgencyReportMessage entity 39506. The MessageHeader is of type GDT: BusinessDocumentMessageHeader. It includes an ID, a ReferenceID, and a CreationDateTime. The ID is a unique identifier for the message, and is of type GDT: MessageID. The ReferenceID is a unique identifier for the message for the request resulting in the CreditAgencyReportResponse, and is of type GDT: MessageID. The CreationDateTime is the creation date and time of message, and is of type GDT: DateTime.

(b) Credit Agency Report Package

The CreditAgencyReport package 39504 includes a CreditAgencyReportCreationLog or Log package 39512, a CreditAgencyReportParty or party package 39514, a CreditWorthinessInformation package 39516, a LegalInformation package 39518, and a CreditAgencyReport entity 39520. There is a 1:1 relationship 39522 between CreditAgencyReportMessage entity 39506 and the CreditAgencyReport entity 39520.

(i) Credit Agency Report

The CreditAgencyReport entity 39520 identifies the credit information issued by the credit agency for a party. The CreditAgencyReport entity 39520 includes the credit information required about a party, with details about the creation of this information.

(ii) Credit Agency Report Creation Log

The CreditAgencyReportCreationLog package 39512 includes a CreationLog entity 39524, which includes a sequence of log messages about the creation of credit information. The CreationLog entity 39524 includes an Item entity 39526. There is a 1:c relationship 39528 between the CreditAgencyReport entity 39520 and the CreationLog entity 39524. There is a 1:n relationship 39530 between the CreationLog entity 39524 and the Item entity 39526.

The Item entity 39526 includes a log message about the creation of credit information, and is of type GDT: LogItem. It includes a TypeID, a SeverityCode, and a Note. The TypeID is a unique identification of the type of a log entry (within the application that created the log). The SeverityCode is a coded representation of the severity of the log message, and is of type GDT: LogItemSeverityCode. The Note is text of the log message, and is of type GDT: Note.

(iii) Credit Agency Report Party Package

The CreditAgencyReportParty package 39514 includes a DebtorParty entity 39532, which identifies the party about whom credit information is to be provided. There is a 1:c relationship 39534 between the CreditAgencyReport entity 39520 and the DebtorParty entity 39532. The DebtorParty entity 39532 includes a StandardID, a CreditAgencyID, an Address, an IncorporationDate, and a BirthDate. The StandardID is the standardized identifier of the party to be checked, and is of type GDT: PartyStandardID. The CreditAgencyID is the identifier given by the credit agency for the party to be checked, and is of type GDT: PartyPartyID. The Address is the address of the party to be checked, and is of type GDT: Address, where FunctionalTitleName, DepartmentName, Office, TaxJurisdictionCode, TimeZoneDifferenceValue, GeoCoordinates need not be used. The IncorporationDate is the incorporation date of a company, if the party to be checked is a company, and is of type GDT: Date. The BirthDate is the date of birth of a natural person, if the party to be checked is a natural person, and is of type GDT: Date. The elements IncorporationDate and BirthDate need not be used together.

(iv) Credit Agency Report Credit Worthiness Information Package

The CreditAgencyReportCreditWorthinessInformation package 39516 includes a summary of the details regarding the creditworthiness of a party in credit information. The CreditAgencyReportCreditWorthinessInformation package 39516 includes a CreditRating entity 39536, a CreditRiskClass entity 39538, a Scoring entity 39540, and a CreditLimit entity 39542. There is a 1:1 relationship 39544 between the CreditAgencyReport entity 39520 and the CreditRating entity 39536. There is a 1:c relationship 39546 between the CreditAgencyReport entity 39520 and the CreditRiskClass entity 39538. There is a 1:cn relationship 39548 between the CreditAgencyReport entity 39520 and the Scoring entity 39540. There is a 1:cn relationship 39550 between the CreditAgencyReport entity 39520 and the CreditLimit entity 39542.

The CreditRating entity 39536 includes the score of a business party determined by the credit agency, which is valid for a specific period. The CreditRating entity 39536 includes a Code and a ValidityPeriod. The Code is the coded representation of the score value, and is of type GDT: CreditRatingCode. The ValidityPeriod is the validity period for the score value, and is of type GDT: DatePeriod.

The CreditRiskClass entity 39538 identifies the risk class of a party determined by the credit agency, which is valid for a specific period. The CreditRiskClass entity 39538 includes a Code and a ValidityPeriod. The Code is the coded representation of the risk class, and is of type GDT: CreditRiskClassCode. The ValidityPeriod is the validity period for the risk class, and is of type GDT: DatePeriod.

The Scoring entity 39540 identifies the result of the rating of a party with regard to their creditworthiness using a scorecard specified by a credit agency. The scorecard is a schema for rating a party using different characteristics. The Scoring entity 39540 is of type GDT: CreditAgencyReportScoring.

Individual or few characteristics are examined for each scorecard; i.e., several scorecards or several scorings are necessary for a comprehensive rating.

The CreditLimit entity 39542 identifies the credit limit valid for a party for a specific period. The CreditLimit entity 39542 includes an Amount and a ValidityPeriod. The Amount is the amount of the credit limit, and is of type GDT: Amount. The ValidityPeriod is the validity period for the credit limit, and is of type GDT: DatePeriod. Due to the different validity periods, there may be more than one credit limit for a party.

(v) Credit Agency Report Legal Information Package

The CreditAgencyReportLegalInformation package 39518 includes a summary of the details regarding the legal facts related to the credit information. The CreditAgencyReportLegalInformation package 39518 includes a LegalEvent entity 39552, which identifies a legal event that affects the creditworthiness of a party. There is a 1:cn relationship 39554 between the CreditAgencyReport entity 39520 and the LegalEvent entity 39552. The LegalEvent entity 39552 includes a TypeCode, a Date and a Description. The TypeCode is the coded representation of the legal event, and is of type GDT: LegalEventTypeCode. The Date is the date of the legal event, and is of type GDT: Date. The Description is the description of the legal event, and is of type GDT: Description. There may be several legal events for one party. Examples of legal events include affidavits, warrants, insolvencies, and seizures.

(5) Message Data Type Element Structure

FIGS. 396A-E depict the element structure for CreditAgencyReportQuery. The element structure is similar to the above-described data model of the message data type CreditAgencyReportQuery in FIG. 394, but provides additional information regarding the details for interfacing with or implementing a CreditAgencyReportQuery. The element structure identifies the different packages 39600 in the interface, and represents the entities at various levels within the interface. As shown in FIG. 396A, the interface for a CreditAgencyReportQuery includes four levels 39602, 39604, 39606, and 39608 each of which is associated with a respective package 39600. The element structure identifies the cardinality or occurrences 39610 of each element and provides a data type name 39612 for each element.

The outermost package of this interface is CreditAgencyReportQuery package 39614, which includes a CreditAgencyReportQueryMessage entity 39616 at the first level 39602. The CreditAgencyReportQueryMessage entity 39616 is of data type MDT: CreditAgencyReportQueryMessage 39618.

The CreditAgencyReportQueryMessage package 39614 includes a MessageHeader package 39620, which includes a MessageHeader entity 39624. The MessageHeader entity 39624 is of data type GDT: MessageHeader 39628. There is one 39626 MessageHeader entity 39624 for each CreditAgencyReportQueryMessage entity 39616.

The MessageHeader entity 39624 includes an ID 39630, a Reference ID 39636, a CreationDateTime 39642, a Sender Party entity 39648 and a Recipient Party entity 39660. The ID 39630 is of data type GDT: BusinessDocumentMessageID 39634. There is one 39632 ID 39630 for each MessageHeader entity 39624. The ReferenceID 39636 is of data type GDT: BusinessDocumentMessageID 39640. There is one or zero 39638 ReferenceID 39636 for each MessageHeader entity 39624. The CreationDateTime 39642 is of data type GDT: DateTime 39646. There is one 39644 CreationTimeData 39642 for each MessageHeader 39624. The SenderParty entity 39648 includes one 39656 InternalID 39654 of the GDT: PartyInternalID 39652 and is of type of GDT: BusinessDocumentMessageHeaderParty 39652. There is one or zero 39650 SenderPartyEntity 39648 for each MessageHeader entity 39624. The RecipientParty entity 39660 includes one 39648 InternalID 39666 of type GDT: PartyInternalID 39670 and is of data type GDT: BusinessDocumentMessageHeaderParty 39664. There is any number 39662 of RecipientParty entities 39660 for each MessageHeader entity 39624.

The CreditAgencyReportQueryMessage package 39614 also includes a CreditAgencyReportQuery package 39622, which includes a CreditAgencyReportQuery entity 39672, a Party package 39684, and a Service package 39686. The CreditAgencyReportQuery entity 39672 is of data type AGDT: Item 39676. In one implementation, there is one 39674 CreditAgencyReportQuery entity for each CreditAgencyReportQueryMessageEntity 39616.

The CreditAgencyReportQuery entity 39672 includes a Reason entity 39678, which has one occurrence 39680 for each entity 39672 and has a data type GDT: CreditAgencyReportQueryReasonCode 39682.

The Party package 39684 includes a DebtorParty entity 39688 of type GDT: BusinessTransactionDocumentParty 39692. The DebtorParty entity 39688 incudes a StandardID 39694, a Credit AgencyID 39600A, an Address 39606A, an IncorporationDate 39612A, and a BirthDate 39618A. The StandardID 39694 is of type GDT: PartyStandardID 39698. The CreditAgencyID 39600A is of type of GDT: PartyPartyID 39604A. The Address 39606A is of type GDT: Address 39610A. The IncorporationDate 39612A is of type GDT: Date. The BirthDate 39618A is of type DT: Date 39622A. In one implementation, for each DebtorParty 39688, there is one or zero 39696 StandardID 39694, one or zero 39602A CreditAgencyID 39600A, one or zero 39608A Address 39606A, one or zero 39614A IncorporationDate 39612A, and one or zero 39620A BirthDate 39618A.

The Service package 39686 includes a Service entity 39624A. There is one 39626A Service entity 39624A for each CreditAgencyReportQuery entity 39672. The Service entity 39624A includes one 39630A CreditAgencyID 39628A of type GDT: ProductPartyID 39632A. There is one 39630A CreditAgencyID 39628A for each Service entity 39624A.

FIG. 397 depicts the element structure for CreditAgencyReportResponse. The element structure identifies the different packages 39700 in the interface, and represents the entities at various levels within the interface. As shown in FIG. 397, the interface for CreditAgencyReportResponse includes five levels 39702, 39704, 39706, 39708, and 39710. The element structure identifies the cardinality or number of occurrences 39712 of each element and provides a data type name 39714 for each element.

The outermost package of this interface is CreditAgencyReportMessage package 39716, which includes a CreditAgencyReportMessage entity 39718 at the first level 39702. The CreditAgencyReportMessage entity 39718 is of data type MDT: CreditAgencyReportMessage 39720.

The CreditAgencyReportMessage package 39716 includes a MessageHeader package 39722 and a CreditAgencyReport package 39724. The MessageHeader package 39722 includes a MessageHeader entity 39726, is of data type GDT: MessageHeader 39730. There is one 39728 MessageHeader entity 39726 for each CreditAgencyReportMessage entity 39718.

The MessageHeader entity 39726 includes an ID 39732, a ReferenceID 39738, a CreationDateTime 39744, a SenderParty 39750, and a RecipientParty 39762. The ID 39732 has one occurrence 39734 for each MessageHeader entity 39726 and is of data type GDT: BusinessDocumentMessageID 39736. The ReferenceID 39738 has zero or one occurrences 39740A for each MessageHeader entity 39726 and is of data type GDT: BusinessDocumentMessageID 39742. The CreationDateTime 39744 has one occurrence 39746 for each MessageHeader entity 39726 and is of data type GDT: DateTime 39748.

The SenderParty 39750 includes one 39758 InternalID 39756 of data type GDT: PartyInternalID 39760. The RecipientParty 39762 includes one 39770 InternalID 39768 of datatype GDT: PartyInternalID 39772. The RecipientParty 39762 is of data type GDT: BusinessDocumentMessageHeaderParty 39766. There is any number 39764 of RecipientParties 39762 for each MessageHeader entity 39726.

The CreditAgencyReport package 39724 includes a CreationLog package 39780, a Party package 39782, a CreditWorthinessInformation package 39784, a Legal Information package 39786, and a CreditAgencyReport entity 39774. The CreditAgencyReport entity 39774 has one occurrence 39776 for each CreditAgencyReportMessage entity 39718 and is of data type GDT:CreditAgencyReport 39778.

The CreationLog package 39780 includes a CreationLog entity 39788 in the second level L2 39704. The CreationLog entity 39788 includes an Item entity 39792 in the third level L3 39706. The Item entity 39792 has a TypeID 39798, a SeverityCode 39704A, and a Note 39710A. The CreationLog entity 39788 has zero or one occurrences 39790 for each CreditAgencyReport entity 39774. The Item entity 39792 has 1 to n occurrences 39794 for each CreationLog entity 39788 and is of data type GDT: LogItem 39796. The TypeID 39798 has zero or one occurrences 39700A for each Item entity 39792 and is of data type xsd: token 39702A. The SeverityCode 39704A has zero or one occurrences 39706A for each Item entity 39792 and is of data type GDT: LogItemSeverityCode 39708A. The Note 39710A has one occurrence 39712A for each Item entity 39792 and is of data type GDT: Note 39714A.

The Party package 39782 inclues a DebtorParty entity 39716A. The DebtorParty entity 39716A has one occurrence 39718A for each CreditAgencyReport entity 39774 and is of data type GDT: BusinessTransactionDocumentParty 39720A. The DebtorParty entity 39716A includes a StandardID 39722A, a CreditAgencyID 39728A, an Address 39734A, an IncorporationDate 39740A, and a BirthDate 39746A. The StandardID 39722A has zero to n occurrences 39724A for each DebtorParty entity 39716A and is of data type GDT: PartyStandardID 39726. The CreditAgencyID 39728A has zero or one occurrences 39730A for each DebtorParty entity 39716A and has a data type of GDT: PartyPartyID 39732A. The Address 39734A has one occurrence 39736A for each DebtorParty entity 39716A and is of data type GDT: Address 39738A. The IncorporationDate 39740A has zero or one occurrences 39742A for each DebtorParty entity 39716A and is of data type GDT: Date 39744A. The BirthDate 39746A has zero or one occurrences 39748A for each DebtorParty entity 39716A and is of data type GDT: Date 39750A.

The CreditWorthinessInformation package 39784 includes a CreditRating entity 39752A, a CreditRiskClass entity 39768A, a Scoring entity 39784A, and a CreditLimit entity 39708B. The CreditRating entity 39752A has one occurrence 39754A for each CreditAgencyReport entity 39774 and includes a Code 39756A and a ValidityPeriod 39762A. The Code 39756A has one occurrence 39758A for each CreditRating entity 39752A, and is of data type GDT: CreditRatingCode 39760A. The ValidityPeriod 39762A has zero or one occurrence 39764A for each CreditRating entity 39752A and is of data type GDT: DatePeriod 39766A. The CreditRiskClass 39768A has one or zero occurrences 39770A for each CreditAgencyReport entity 39774 and includes a Code 39772A and a ValidityPeriod 39778A. The Code 39772 has one occurrence 39774A for each CreditRiskClass entity 39768A and is of data type GDT: CreditRiskClassCode 39776A. The ValidityPeriod 39778A has zero or one occurrences 39780A for each CreditRiskClass entity 39768A and is of data type GDT: DatePeriod 39782A. The Scoring entity 39784A includes a ScoreCardID 39790A, a ResultValue 39796A, and a Description 39702B. The Scoring entity 39784A has zero to n occurrences 39786A for each CreditAgencyReport entity 39774 and is of data type GDT: CreditAgencyReport Scoring 39788A. The ScoreCardID 39790A has zero or one occurrences 39792A for each Scoring entity 39784A and is of data type 397 GDT: ScoreCardID 39794A. The ResultValue 39796A has one occurrence 39798A for each Scoring entity 39784A and a data type xsd:decimal 39700A. The Description 39702B has zero or one occurrences 39704B for each Scoring entity 39784A and is of data type GDT: Description 39706B. The CreditLimit 39708B has zero or n occurrences 39710B for each CreditAgencyReport entity 39774 and includes an Amount 39712B and a ValidityPeriod 39718B. The Amount 39712B has one occurrence 39714B for each CreditLimit entity 39708B and is of data type GDT: Amount 39716B. The ValidityPeriod 39718B has zero or one occurrence 39720B for each CreditLimit entity 39708B and is of data type GDT: DatePeriod 39722B.

The LegalInformation package 39786A includes a LegalEvent entity 39724B. The LegalEvent entity 39724B includes a TypeCode 39728B, a Date 39734B, and a Description 39740B. The LegalEvent entity 39724B has zero to n occurrences 39726B for each Item entity 39774. The TypeCode 39728B has zero or one occurrences 39730B for each LegalEvent entity 39724B and is of data type GDT: LegalEventTypeCode 39732B. The Date 39734B has zero or one occurrences 39736B for each CreditLimit entity 39708B and is of data type GDT: Date 39738B. The Description 39740B has zero or one occurrences 39742B for each CreditLimit entity 39708B and is of data type GDT: Description 39744B.

m) Accounting Cancellation Request

In the business scenario Sell from Stock, a goods receipt or an outgoing invoice is executed and transferred to Accounting. It is then established that this process step is to be cancelled. In this case, a cancellation request for the original message is sent to Accounting and any further recipients affected. One feature of the cancellation message may be that the reference to the original business transaction is transferred; no additional posting information is transferred. The cancellation message defined here is to be used for cancellation of an InvoiceAccountingInformation and an InventoryChangeAccountingInformation. It may also be used for other future messages that create postings in Accounting.

(1) Message Types

For each message type used for a posting in Accounting, there is a corresponding message type for cancelling this posting. Since cancellation requests to Financial Accounting are via reference, they are based on the same message data type AccountingCancellationMessage for messages to Financial Accounting.

(a) Message Type Invoice Accounting Cancellation Request

An InvoiceAccountingCancellationRequest is a request for the cancellation of posting information previously sent to Accounting for an incoming or outgoing invoice or credit memo (InvoiceAccountingNotification). The message type InvoiceAccountingCancellationRequest is based on the message data type AccountingCancellationMessage. In one implementation, Accounting cannot reject the cancellation.

(b) Message Type Inventory Change Accounting Cancellation Request

An InventoryChangeAccountingCancellationRequest is a request for the full cancellation of posting information previously sent to Accounting with respect to a goods movement (InventoryChangeAccountingNotification). The message type InventoryChangeAccountingCancellationRequest is based on the message data type AccountingCancellationMessage. In one implementation, Accounting cannot reject the cancellation.

(2) Message Choreography

FIG. 398 depicts the Message Choreography for the AccountingCancellationRequest interface between Invoice/Billing 39802 and Accounting 39804. Invoice/Billing 39802 sends an InvoiceAccountingNotification 39806 to Accounting 39804. Invoice/Billing 39802 may then send an InvoiceAccountingCancellationRequest 39808 to Accounting 39804.

The receipt of an invoice in invoice verification causes an accounting document to be posted in Accounting. The invoice received can be cancelled and, as a result, leads to a cancellation of the related invoice document in Accounting.

(3) Message Data Type Accounting Cancellation Message

The message data type AccountingCancellationMessage includes the AccountingCancellation object included in the business document and the business information that is relevant for sending a business document in a message. As depicted in FIG. 399, the message data type AccountingCancellationMessage includes an AccountingCancellationMessage package 39900, which includes a MessageHeader package 39902 and an AccountingCancellation package 39904. The AccountingCancellationMessage package 39900 also includes an AccountingCancellationMessage entity 39906. The message data type AccountingCancellationMessage provides the structure for the message type AccountingCancellation and the relevant interfaces.

(a) Message Header Package

A MessageHeader package 39902 groups the business information that is relevant for sending a business document in a message. The MessageHeader is not required for AccountingCancellationRequest. In one implementation, a cancellation is sent to Accounting once. A message ID is not required, since the reference can be established with the ID of the source document. The sender may be known as the "system ID." In one implementation, the recipient is not known; the fact that this message is to be sent to the Accounting application is known.

(b) Accounting Cancellation Package

The AccountingCancellation package 39904 is the grouping of information required for the cancellation of posting information previously sent to Accounting. It includes a BusinessTransactionDocumentReference Package 39908 and an AccountingCancellation entity 39910. There is a 1:1 relationship 39912 between the AccountingCancellationMessage entity 39906 and the AccountingCancellation entity 39910.

(i) Accounting Cancellation

The AccountingCancellation is the cancellation of posting information previously sent to Accounting. The AccountingCancellation entity 39910 identifies the business document to be cancelled by means of the reference and type of business transaction in which the document was created or involved. The AccountingCancellation entity 39910 includes an OriginBusinessTransactionTypeCode, a PostingDate, and a Description. The OriginBusinessTransactionTypeCode is a business transaction type in which the document to be cancelled was created, and is of the type GDT: BusinessTransactionTypeCode. The PostingDate is the date on which the transaction is relevant for Accounting, and is of the type GDT: Date. The Description is a description of the cancellation, and is of the type GDT: Description.

(ii) Business Transaction Document Reference Package

The BusinessTransactionDocumentReference package 39908 groups the references to business documents on which the cancellation transaction is based. The BusinessTransactionDocumentReference package 39908 includes a PrimaNotaReference entity 39914 and an OriginPrimaNotaReference entity 39916. There is a 1:c relationship 39918 between the AccountingCancellation entity 39910 and the PrimaNotaReference entity 39914. Similarly, there is a 1:c relationship 39920 between the AccountingCancellation entity 39910 and the OriginPrimaNotaReference entity 39916.

The PrimaNotaReference indicates the reference to the document of the sender which represents the cancellation request to Accounting. The PrimaNotaReference entity 39914 is of type GDT: BusinessTransactionDocumentReference, where the element "ID" is used, since there is no reference to a line item. The PrimaNotaReference entity 39914 is typically filled.

The OriginPrimaNotaReference indicates the reference to the origin document of the sender on which posting information previously sent to Accounting—and now to be cancelled—is based. The OriginPrimaNotaReference entity 39916 is of type GDT: BusinessTransactionDocumentReference where the element "ID" is used since there is no reference to a line item; for example, reference to the document for an invoice, credit memo, or payment, but also the document for an inventory change in the stockholding. The OriginPrimaNotaReference entity 39916 is typically filled.

(4) Message Data Type Element Structure

FIGS. 400A-B depict the element structure for AccountingCancellationRequest. The element structure is similar to the data model, but provides additional information regarding the details of the interface. The element structure identifies the different packages 40000 in the interface, and represents the entities at various levels within the interface. As depicted in FIGS. 400A-B, the interface for AccountingCancellationRequest includes four levels 40002, 40004, 40006, and 40008. The element structure identifies the cardinality or occurrence 40010 between the entities of the interface, and provides information, e.g., the data type 40012, that provides the basis for the entities or elements. The outermost package of this interface is an AccountingCancellationMessage package 40014, which includes an AccountingCancellationMessage entity 40016 at the first level 40002. There is one 40018 AccountingCancellationMessage entity 40016 for each AccountingCancellationMessage package 40014.

The AccountingCancellationMessage package 40014 also includes an AccountingCancellation package 40020. The AccountingCancellation package 40020 includes an AccountingCancellation entity 40022. There is one 40024 AccountingCancellation entity 40022 for each AccountingCancellationMessage entity 40016. The AccountingCancellation entity 40022 includes an OriginBusinessTransactionType 40026, a PostingDate 40032, and a Description 40038. The OriginBusinessTransactionType 40026 is of type GDT BusinessTransactionTypeCode 40030. There is one 40028 OriginBusinessTransactionType 40026 for each AccountingCancellation entity 40022. The PostingDate 40032 is of type GDT Date 40036, and there is zero or one 40034 PostingDate 40032 for each AccountingCancellation entity 40022. The Description 40038 is of type GDT Description 40042, and there is zero or one 40040 Description 40038 for each AccountingCancellation entity 40022.

The AccountingCancellation package 40020 also includes a BusinessTransactionDocumentReference package 40044. The BusinessTransactionDocumentReference package 40044 includes a PrimaNotaReference entity 40046 and an OriginPrimaNotaReference entity 40058. The PrimaNotaReference entity 40046 is of type GDT BusinessTransactionDocumentReference 40050. There is one 40048 PrimaNotaReference entity 40046 for each AccountingCancellation entity 40022. The PrimaNotaReference entity 40046 includes an ID 40052, which is of type GDT BusinessTransactionDocumentID 40056. The occurrence of the ID 40052 is one 40054. The OriginPrimaNotaReference entity 40058 is of type GDT BusinessTransactionDocumentReference 40062. There is one 40060 OriginPrimaNotaReference entity 40058 for each AccountingCancellation entity 40022. The OriginPrimaNotaReference entity 40058 includes an ID 40064, which is of type GDT BusinessTransactionDocumentID 40068. The occurrence of the ID 40064 is one 40066.

n) Invoice Due Interfaces

Invoice due interfaces are interfaces that transmits information about a business transaction to be settled to Billing (billing document creation) or Invoicing (invoice verification).

In this document, the term "settlement" refers to creating billing documents (outgoing invoices and credit memos), incoming, and "self-billing" invoices and to checking incoming invoices.

The motivating business scenarios for the invoice due interfaces are the Procure to Stock (PTS) and Sell from Stock (SFS) scenarios. Goods are purchased in the PTS scenario. After a delivery has been received and the appropriate goods receipt has been posted, the delivery data that are relevant for invoicing (with reference to the purchase order) are transmitted to Invoicing. Goods are sold in the SFS scenario. After an order has been created in Sales (BAC CRM), the elements of the contract that are relevant for billing are transmitted to Billing. This enables contract-related billing to be carried out. After the appropriate deliveries have been made and the relevant goods issues have been posted, the logistics data (with reference to the order) are transmitted to Billing. Then delivery-related billing can be carried out for the order.

(1) Message Types (a) Billing Due Notification

The BillingDueNotification is a notification about data relevant for billing to an application that carries out billing. The message type BillingDueNotification is based on the message data type InvoiceDueMessage.

This message type is used for the following business transactions: (1) Billing based on contract data (e.g., credit memo requests debit memo requests, etc.); (2) Billing of delivery data with reference to contract data (e.g., a standard order with order items relevant for delivery); (3) Billing of delivery data without reference to contract data; and (4) Billing of contract data (such as a standard order) in accordance with the delivery quantities (general delivery data).

(b) Invoicing Due Notification

The InvoicingDueNotification is a notification about data relevant structure for invoicing to an application that checks and creates incoming invoices and/or creates "self-billing" invoices (ERS). The message type InvoicingDueNotification is based on the message data type InvoiceDueMessage.

(2) Message Choreography

FIG. 401 depicts the message choreography for exemplary Billing Due Notification and Invoicing Due Notification processes.

(a) Billing Due Notification

Referring to FIG. 401, data that are relevant for billing are transmitted from Sales (CRM) 40100 and Supply Chain Execution (SCE) 40100 to Billing (invoice creation) 40106 via appropriate BillingDueNotification messages 40108 and 40110. The message is used to create and change data that are relevant for billing (the BillingDueNotification is sent again). The data are always transmitted in their entirety. Thus, Sales 40100 transmits a BillingDueNotification message 40106 to Billing 40104 while SupplyChainExecution 40102 transmits a BillingDueNotification message 40108 to Billing 40104.

(b) Invoicing Due Notification

Referring to FIG. 401, data that are subject to settlement are transmitted from Purchasing (SRM) 40110 and Supply Chain Execution (SCE) 40112 to Invoicing (invoice verification) 40114 using appropriate InvoicingDueNotification messages 40116 and 40118. The message is used to create and change data that are subject to settlement (the InvoicingDueNotification is sent again). The data are always transmitted in their entirety. Thus, Purchasing 40110 transmits an InvoicingDueNotification message 40116 to Invoicing 40114 while SupplyChainExecution 40112 transmits a InvoicingDueNotification message 40118 to Invoicing 40114.

(3) Message Data Type Data Model Invoice Due Message

FIG. 402 depicts a data model for the InvoiceDueMessage. The message data type InvoiceDueMessage includes an InvoiceDue object, which includes an InvoiceDueMessage package 40200. The InvoiceDueMessage package 40200 includes a MessageHeader package 40202, an InvoiceDue package 40204, and an InvoiceDueMessage entity 40206. The message data type InvoiceDueMessage provides the structure for the following message types: BillingDueNotification, InvoicingDueNotification and the interfaces based on them.

(a) Message Header Package

The MessageHeader package 40202 groups together the business information that is relevant for sending a business document in a message. The MessageHeader package currently does not contain any entries. The reference to the base business document is always made by establishing a reference to the purchase order, delivery, etc. The sender is also identified by means of the reference. The sender does not know who the recipient is and knows only that the message is to be sent to a billing or invoicing application.

(b) Invoice Due Package

The InvoiceDue package 40204 groups all information that is required for a settlement (creation of billing documents and invoice verification). It includes a Party package 40208, a Location package 40210, a DeliveryInformation package 40212, a PaymentInformation package 40214, a PriceInformation package 40216, an AccountAssignment package 40218, an Attachment package 40220, a Description package 40222, an Item package 40224, and an InvoiceDue entity 40226. There is a 1:1 relationship 40228 between the InvoiceDueMessage entity 40206 and the InvoiceDue entity 40226.

(i) Invoice Due

An InvoiceDue package 40204 comprises information that summarizes all details about a business transaction that are relevant for settling this business transaction, where settling means the creation of billing documents and the checking and creation ("self-billing") of incoming invoices. InvoiceDue consists of InvoiceDueItems, which represent items in the base business document for the future settlement. An Invoice- DueItem usually consists of information about the quantity of a product that has been ordered or delivered, as well as the business partners, locations, terms of delivery and payment involved and the other business documents to be taken into account when the product is settled. Data that applies to (almost) all InvoiceDueItems can also be entered directly at header level.

InvoiceDue includes a BaseBusinessTransactionDocumentID, a BaseBusinessTransactionDocumentTypeCode, an ActionCode, a SettlementRelevanceIndicator, a SettlementPriorityCode, a SettlementBlockedIndicator, an ItemListCompleteTransmissionIndicator, a PlannedBillingDate, a ProposedInvoiceDate, and a DeliveryPeriod. The BaseBusinessTransactionDocumentID is a unique identifier for a base business document for the InvoiceDue, and is of type GDT: BusinessTransactionDocumentID. The BaseBusinessTransactionDocumentTypeCode is the coded representation of the type of the base business document for the InvoiceDue. The types sales order and (outgoing) delivery are currently relevant for the message type BillingDueNotification; the types purchase order, sales order, and (incoming) delivery are currently relevant for the message type InvoicingDueNotification. The BaseBusinessTransactionDocumentTypeCode is of type GDT: BusinessTransactionDocumentTypeCode. The ActionCode is the coded representation of an instruction to the recipient of the message telling it, whether to create, change or delete the InvoiceDue, and is of type GDT: ActionCode. The SettlementRelevanceIndicator specifies whether the business transaction is subject to settlement, and is of type GDT: BusinessTransactionDocumentSettlementRelevanceIndicator. The SettlementPriorityCode is the coded representation of the urgency of a due settlement, and is of type GDT: BusinessTransactionPriorityCode. The SettlementBlockedIndicator specifies whether the settlement for the transmitted data is blocked, and is of type GDT: BusinessTransactionBlockedIndicator. The ItemListCompleteTransmissionIndicator specifies whether all the items in the base business document for the InvoiceDue are to be transmitted (items that are not transmitted are implicitly classed as cancelled) or whether only new items or items that have been changed since the last transmission are to be transmitted, and is of type GDT: CompleteTransmissionIndicator. The PlannedBillingDate is the planned date for billing a document in a business transaction, and is of type GDT: Date. The ProposedInvoiceDate is the date for the billing business document (invoice, credit memo, debit memo, etc.), and is of type GDT: DateTime. The DeliveryPeriod specifies the period of time during which a service is provided, and is of type GDT: DateTimePeriod.

Since the data is always transmitted in its entirety, the ItemListCompleteTransmissionIndicator has the value "true." The soft semantic (ActionCodes "04"/"05") is used for the ActionCode, since the applications receiving the data contain the data subject to settlement from the transmitted item. For the ActionCode the default-logic applies as described in the "Notes (Regarding the Message Data Type)." ActionCode "04" is interpreted by the receiving application as a change statement for the items to be transmitted, provided that they have already been transmitted by a previous message. If this is not the case, the transmitted items are created. The ActionCode "05" (REMOVE) signalizes to the receiving application that item transmitted previously for a business transaction (and cancelled now) are not relevant for settlement any more.

Initially, only the information about the date is used from the ProposedInvoiceDate element; hours, minutes, and seconds are ignored. For the element ActionCode a default-logic applies. The ActionCode specified for the entity InvoiceDue is valid for all InvoiceDueItems that do not have an explicitely different ActionCode. If no ActionCode is specified explicitely for the entity InvoiceDue, the ActionCode "04" shall be assumed as default.

Notes (Regarding the Message Type InvoicingDueNotification): Default logic is not supported for the following elements: SettlementRelevanceIndicator, SettlementBlockedIndicator, ProposedBillingDate, ProposedInvoiceDate, and DeliveryPeriod. For this reason, these elements are not used at InvoiceDue level. The SettlementPriority element is initially not supported.

Notes (Regarding the Message Type BillingDueNotification): In case of an ActionCode "05" the receiving application has to decide, whether data already transmitted for a business transaction is disregarded with respect to further settlement or—in case of a settlement already done—revoked using a cancellation or credit memo. If the SettlementPriority element is used, the highest level of priority (Code '1') denotes immediate or direct billing. All other levels of priority denote background/online billing rather than immediate billing. Default logic is used for the elements SettlementRelevanceIndicator and BillingBlockedIndicator: the relevant indicators at InvoiceDue level apply to all corresponding indicators at InvoiceDueItem level for which values have not been transmitted. The following default logic is used for the DeliveryPeriod element: only the date specified in the StartDateTime attribute is interpreted as being the date on which a service is provided (requested delivery date, date of the goods issue posting); all other information is ignored. If an appropriate date is transmitted at InvoiceDue level, it is used as the date at InvoiceDueItem level in the DeliveryPeriod element for which values have not been transmitted.

Example—Usually the base business transaction for an InvoiceDueMessage is an order, a purchase order, or a delivery.

(ii) Party Package

The Party package 40208 groups information relating to all business partners that might be involved in a settlement. The Party package 40208 includes a BuyerParty entity 40230, a SellerParty entity 40232, a ProductRecipientParty entity 40234, a VendorParty entity 40236, a BillToParty entity 40238, a BillFromParty entity 40240, a PayerParty entity 40242, and a PayeeParty entity 40244. There is a 1:c relationship 40246 between the InvoiceDue entity 40226 and the BuyerParty 40230. There is a 1:c relationship 40248 between the InvoiceDue entity 40226 and the SellerParty 40232. There is a 1:c relationship 40250 between the InvoiceDue entity 40226 and the ProductRecipientParty 40234. There is a 1:c relationship 40252 between the InvoiceDue entity 40226 and the VendorParty 40236. There is a 1:c relationship 40254 between the InvoiceDue entity 40226 and the BillToParty 40238. There is a 1:c relationship 40256 between the InvoiceDue entity 40226 and the BillFromParty 40240. There is a 1:c relationship 40258 between the InvoiceDue entity 40226 and the PayerParty 40242. There is a 1:c relationship 40260 between the InvoiceDue entity 40226 and the PayeeParty 40244.

Default logic is used for all business partners: business partners that are specified at InvoiceDue level are used for all the items for which a corresponding partner is not explicitly transmitted. The default logic applies for the partner as a whole, including the contact person. Parts of a partner cannot be specified in more detail at item level. The default logic is only a simplified version of the transmitted message. In terms of logic, partners at InvoiceDue level behave as if they have been explicitly transmitted for all the items of the message.

(a) Buyer Party

A BuyerParty is a company or person that purchases goods or services. The BuyerParty entity 40230 is of type GDT: BusinessTransactionDocumentParty, where only the "InternalID" is used. The BuyerParty entity 40230 is entered for a settlement and therefore is specified at InvoiceDue or InvoiceDueItem level in the message if the BusinessTransactionDocumentTypeCode element refers to a business transaction of type order or purchase order. The BuyerParty entity 40230 can also fulfill the functions of the ProductRecipientParty entity 40234, the BillToParty entity 40238 or the PayerParty entity 40242.

The default logic in the Party package 40208 includes a Address entity 40262 and a Contact entity 40264. There is a 1:c relationship 40266 between BuyerParty entity 40230 and Address entity 40262. There is a 1:c relationship 40268 between BuyerParty entity 40230 and Contact entity 40264.

The Address entity 40262 includes a PersonName entity 40270, an Office entity 40272, a PhysicalAddress entity 40274, a GeoCoordinates entity 40276, and a Communication entity 40278. There is a 1:c relationship 40280 between PersonName entity 40270 and Address entity 40262. There is a 1:c relationship 40282 between Office entity 40272 and Address entity 40262. There is a 1:c relationship 40284 between PhysicalAddress entity 40274 and Address entity 40262. There is a 1:c relationship 40286 between GeoCoordinates entity 40276 and Address entity 40262. There is a 1:c relationship 40288 between Communication entity 40278 and Address entity 40262.

The Contact entity 40264 includes an Address entity 40290. There is a 1:c relationship 40292 between Address entity 40290 and Contact entity 40264. The Address entity 40290 includes a PersonName entity 40294, an Office entity 40296, a PhysicalAddress entity 40298, a GeoCoordinates entity 40200A, and a Communication entity 40202A. There is a 1:c relationship 40204A between PersonName entity 40294 and Address entity 40290. There is a 1:c relationship 40206A between Office entity 40296 and Address entity 40290. There is a 1:c relationship 40208A between PhysicalAddress entity 40298 and Address entity 40290. There is a 1:c relationship 40210A between GeoCoordinates entity 40200A and Address entity 40290. There is a 1:c relationship 40212A between Communication entity 40202A and Address entity 40290.

(b) Seller Party

A SellerParty is a company or person that sells goods or services. The SellerParty entity 40232 is of type GDT: BusinessTransactionDocumentParty, where only the "InternalID" is used. The SellerParty entity 40232 can also fulfill the functions of the VendorParty entity 40236, the BillFromParty entity 40240 or the PayeeParty entity 40244. The SellerParty entity 40232 is entered for a settlement and therefore is specified at InvoiceDue or InvoiceDueItem level in the message if the BusinessTransactionDocumentTypeCode element refers to a business transaction of type order or purchase order.

The SellerParty entity 40232 includes the same Address and Contact entities 40214A as found for the BuyerParty 40230.

(c) Product Recipient Party

A ProductRecipientParty is a company or person to whom goods are delivered or for whom services are provided. The ProductRecipientParty entity 40234 is of type GDT: BusinessTransactionDocumentParty, where only the "InternalID" is used. If no ShipToLocation is explicitly specified, the ProductRecipientParty address is the delivery address. If no ProductRecipientParty entity 40234 is explicitly specified, the BuyerParty entity 40230 acts as ProductRecipientParty.

The ProductRecipientParty entity 40234 includes the same Address and Contact entities 40216A as found for the BuyerParty 40230.

(d) Vendor Party

A VendorParty is a company or person that delivers goods or provides services. The VendorParty entity 40236 is of type GDT: BusinessTransactionDocumentParty, where only the "InternalID" is used. If no ShipFromLocation is explicitly specified, the VendorParty address is the ship-from address. If no VendorParty entity 40236 is explicitly specified, the SellerParty entity 40232 is also VendorParty. The VendorParty is not the company or person that is solely responsible for transporting the goods. The CarrierParty is responsible for this.

The VendorParty entity 40236 includes the same Address and Contact entities 40218A as found for the BuyerParty 40230.

(e) Bill To Party

A BillToParty is a company or person to which the invoice for goods or services is sent. The BillToParty entity 402 38 is of type GDT: BusinessTransactionDocumentParty, where only the "InternalID" is used. If no BillToParty entity 40238 is explicitly specified, the BuyerParty acts as BillToParty.

The BillToParty entity 40238 includes the same Address and Contact entities 40220A as found for the BuyerParty 40230.

(f) Bill From Party

A BillFromParty is a company or person that draws up the invoice for goods or services. The BillFromParty entity 40240 is of type GDT: BusinessTransactionDocumentParty, where only the "InternalID" is used. If no BillFromParty entity 40240 is explicitly specified, the SellerParty entity 40232 acts as BillFromParty.

The BillFromParty entity 40240 includes the same Address and Contact entities 40222A as found for the BuyerParty 40230.

(g) Payer Party

A PayerParty is a company or person that pays for goods or services. The PayerParty entity 40242 is of type GDT: BusinessTransactionDocumentParty, where only the "InternalID" is used. If no PayerParty entity 40242 is explicitly specified, the BillToParty entity 40230 acts as PayerParty.

The PayerParty entity 40242 includes the same Address and Contact entities 40224A as found for the BuyerParty 40230.

(h) Payee Party

A PayeeParty is a company or person that receives payment for goods or services. The PayeeParty entity 40244 is of type GDT: BusinessTransactionDocumentParty, where only the "InternalID" is used. If no PayeeParty entity 40244 is explicitly specified, the BillFromParty entity 40240 acts as PayeeParty.

The PayeeParty entity 40244 includes the same Address and Contact entities 40226A as found for the BuyerParty 40230.

(iii) Location Package

The Location package 40210 groups all locations that can occur in a settlement. The Location package 40210 includes a ShipToLocation entity 40228A and a ShipFromLocation entity 40230A. There is a 1:c relationship 40232A between the InvoiceDue entity 40226 and the ShipToLocation entity 40228A. There is a 1:c relationship 40234A between the InvoiceDue entity 40226 and the ShipFromLocation entity 40230A.

Default logic is used for all locations: locations that are specified at InvoiceDue level are used for all items for which corresponding locations are not explicitly transmitted. ShipToLocation and ShipFromLocation can be used to provide a detailed description of the flow of goods (between the ship-to location and the ship-from location). In specific countries, this detailed information is required for calculating taxes (e.g., United States).

(a) Ship To Location

A ShipToLocation is the place to which goods are shipped or where services are provided. The ShipToLocation entity 40228A is of type GDT: BusinessTransactionDocument-Location. A sold-to party (BuyerParty) headquartered in California in the US orders steel beams for a building. The construction site (ShipToLocation) for the building is located in Arizona. The tax amount is calculated using the tax rates that apply in Arizona.

The ShipToLocation entity 40228 includes an Address entity 40236A. There is a 1:c relationshiop 40238A between Address entity 40236A and ShipToLocation 40228A.

The Address entity 40236A includes a PersonName entity 40240A, an Office entity 40242A, a PhysicalAddress entity 40244A, a GeoCoordinates entity 40246A, and a Communication entity 40248A. There is a 1:c relationship 40250A between the PersonName entity 40240A and the Address entity 40236A. There is a 1:c relationship 40252A between the Office entity 40242A and the Address entity 40236A. There is a 1:c relationship 40254A between the PhysicalAddress entity 40244A and the Address entity 40236A. There is a 1:c relationship 40256A between the GeoCoordinates entity 40246A and the Address entity 40236A. There is a 1:c relationship 40258A between the Communication entity 40248A and the Address entity 40236A.

(b) Ship From Location

A ShipFromLocation is the place from which goods are shipped. The ShipFromLocation 40230A is of type GDT: BusinessTransactionDocumentLocation.

The ShipFromLocation 40230A includes the same Address entity information 40259A as found for the ShipToLocation entity 40228A.

(iv) Delivery Information Package

The DeliveryInformation package 40212 groups all information for a required delivery in the settlement. It includes a DeliveryTerms entity 40260A. The default logic used for DeliveryTerms is similar to that used for Parties. There is a 1:c relationship 40262A between the InvoiceDue entity 40226 and the DeliveryTerms entity 40260A.

DeliveryTerms are the conditions and agreements that are valid for executing the delivery and transporting the ordered goods and for the necessary services and activities. The DeliveryTerms entity 40260A is type GDT: DeliveryTerms. Of the DeliveryTerms, Incoterms and transport can be used for material items only. The default logic takes Incoterms and transport into account for material items only. For all other items, Incoterms and transport are ignored.

(v) Payment Information Package

The PaymentInformation package 40214 groups payment information in the settlement. The PaymentInformation package 40214 includes a CashDiscountTerms entity 40264A and a PaymentForm entity 40266A. There is a 1:c relationship 40268A between the InvoiceDue entity 40226 and the CashDiscountTerms entity 40264A. There is a 1:c relationship 402670A between the InvoiceDue entity 40226 and the PaymentForm entity 40266A. The default logic used for CashDiscountTerms and the PaymentForm is similar to that used for Parties. In exemplary embodiments, the PaymentInformation package 40214 also includes a MaximumDiscount entity 40272A, a NormalDiscount entity 40274A, and a PaymentCard entity 40276A. There is a 1:c relationship 40278A between the CashDiscountTerms entity 40264A and the MaximumDiscount entity 40272A. There is a 1:c relationship 40280A between the CashDiscountTerms entity 40264A and the NormalDiscount entity 40274A. There is a 1:c relationship 40282A between the PaymentForm entity 40266A and the PaymentCard entity 40266A.

(a) Cash Discount Terms

The CashDiscountTerms are the terms of payment (cash discount rates and payment deadlines). The CashDiscountTerms entity 40264A is type GDT: CashDiscountTerms.

(b) Payment Form

The PaymentForm is the payment form and the data required for it. The PaymentForm entity 40266A includes the PaymentCard entity 40276A. The PaymentFormCode is the coded representation of the payment form. The valid payment form in a billing process is determined in accordance with the following rules: (1) If the payment form was transmitted explicitly with an invoice, this payment form applies, otherwise (2) If the payment form was agreed upon by both parties, this payment method applies, otherwise (3) standard payment form applies, as defined in the GDT: PaymentFormCode. PaymentCard is to be filled only for the payment form "PaymentCard; for all other payment forms, it can be ignored by the recipient.

The PaymentCard is a credit card or a customer card. The PaymentCard entity 40276A is of type GDT: PaymentCard.

(vi) Price Information Package

The PriceInformation package 40216 summarizes all the information about the total amount to be settled for products and services and details all the tax price components. It includes a Price entity 40284A. There is a 1:c relationship 40286A between the InvoiceDue entity 40226 and the Price entity 40284A.

The Price entity 40270A is the total amount to be settled for products and services, including tax and net portions. The Price entity 40284A includes a GrossAmount, a NetAmount, a TaxAmount, an ExchangeRate, and a PricingDate. The GrossAmount is the gross invoice amount; net amount plus tax amount, and is of type GDT: Amount. The NetAmount is the net invoice amount, and is of type GDT: Amount. The TaxAmount is the tax amount of an invoice, and is of type GDT: Amount. The ExchangeRate is the information about the exchange rate, and is of type GDT: ExchangeRate. The PricingDate is the date on which the price is calculated, and is of type GDT: DateTime.

The gross and net amounts are specified in the same currency. If a following currency is specified in the ExchangeRate element, the following currency is the same as the currency in the gross/net amount. If the ExchangeRate element is not specified at all, the currency of the gross/net amount is set as the following and leading currency (in this case, the exchange rate would be set to the uniform rate). Specifying currencies at header level is optional. If they are specified, they are the same as the currencies specified at item level.

Integrity (Regarding the Message Type BillingDueNotification): Currencies (following and leading currency) for a settlement do not have to be specified unless the SalesOrderReference entity is not specified (filled with values) at InvoiceDueItem level in the BusinessTransactionDocumentReference package.

(vii) Account Assignmnet Package

The AccountAssignment package 40218 groups account assignment information for accounting. It includes an AccountAssignment entity 40288A. There is a 1:nc relationship 40290A between the InvoiceDue entity 40226 and the AccountAssignment entity 40288A.

The AccountAssignment package 40218 includes all information about the account assignment objects in accounting to which the base business transaction refers. The account assignment can be distributed to various objects (such as the cost center or order) on a percentage basis. In this case, the total of the account assignments is 100%. The default logic used for the AccountAssignment package 40218 is similar to that used for Parties.

An AccountAssignment provides information about an account assignment object and the percentage rate to be used. The AccountAssignment entity 40288A is of type GDT: AccountingObjectSetDistribution.

(viii) Attachment Package

The Attachment package 40220 groups all attachment information regarding the settlement process. It includes an AttachmentWebAddress entity 40292A. There is a 1:cn relationship 40294A between the InvoiceDue entity 40226 and the AttachmentWebAddress entity 40292A.

The AttachmentWebAddress is a web address for a document of any type that relates to a settlement. The AttachmentWebAddress entity 40292A is of type GDT: AttachmentWebAddress.

(ix) Description Package

The Description package 40222 groups all explanatory texts regarding a settlement. It includes a Description entity 40296A. There is a 1:c relationship 40298A between the InvoiceDue entity 40226 and the Description entity 40296A.

The Description is natural-language text with additional information about a settlement. Description entity 40296A is of type GDT: Description.

(c) Invoice Due Item Package

The InvoiceDueItem package 40224 groups item information from the basic business document for the future settlement. It includes a ProductInformation package 40200B, a PriceInformation package 40202B, a Party package 40204B, a Location package 40206B, a DeliveryInformation package 40208B, a PaymentInformation package 40210B, a BusinessTransactionDocumentReference package 40212B, an AccountAssignment package 40214B, an Attachment package 40216B, a Description package 40218B, an Item entity 40229BB and an ItemHierarchyRelationship entity 40224B. There is a 1:n relationship 40222B between the InvoiceDue entity 40226 and the Item entity 40220B. There is a 1:c relationship 40226B or a 1:cn relationship 40228B between the Item entity 40220B and the ItemHierarchyRelationship 40224B.

(i) Invoice Due Item

An InvoiceDueItem entity 40220B summarizes all information from a business document item that is to be taken into account in the future settlement. The InvoiceDueItem entity 40220B typically consists of information about the quantity of a product that has been ordered or delivered, as well as business partners, locations, terms of delivery and payment conditions and the other business documents to be taken into account when the product is settled.

The InvoiceDueItem entity 40220B includes a BaseBusinessTransactionDocumentID, a BaseBusinessTransactionDocumentItemTypeCode, an ActionCode, a SettlementRelevanceIndicator, an EvaluatedReceiptSettlementIndicator, a SettlementBlockedIndicator, a PricingIndicator, a PlannedBillingDate, a ProposedInvoiceDate, a DeliveryPeriod, and a Quantity. The BaseBusinessTransactionDocumentID is a unique identifier for the item in the base business document for the InvoiceDue, and is of type GDT: BusinessTransactionDocumentID. The BaseBusinessTransactionDocumentItemTypeCode is the coded representation of the type of the item in which the base business document for the InvoiceDue is stored. Information about the calendar day. Currently, the types sales order item and delivery item are relevant for the message type BillingDueNotification; the types purchase order item, sales order item, and delivery item are relevant for the message type InvoicingDueNotification. The BaseBusinessTransactionDocumentItemTypeCode is of type GDT: BusinessTransactionDocumentItemTypeCode. The ActionCode is the coded representation of the request to the recipient of the InvoiceDue message to create, change, and delete InvoiceDueItems, and is of type GDT: ActionCode. The SettlementRelevanceIndicator indicates whether the specified item is subject to settlement, and is of type GDT: BusinessTransactionDocumentSettlementRelevanceIndicator. The EvaluatedReceiptSettlementIndicator is the indicator that specifies whether an invoice is to be automatically created for the item, and is of type GDT: EvaluatedReceiptSettlementIndicator. The SettlementBlockedIndicator specifies whether a settlement item is blocked for further processing, and is of type GDT: BusinessTransactionBlockedIndicator. The PricingIndicator specifies whether pricing/price determination is to be performed for the specified item, and is of type GDT: BusinessTransactionDocumentPricingIndicator. The PlannedBillingDate is the planned date for billing a specified item, and is of type GDT: Date. The ProposedInvoiceDate is the date for the billing document for a specified item, and is of type GDT: DateTime. The DeliveryPeriod specifies the exact time or the period of time during which a service is provided, and is of type GDT: DateTimePeriod. The Quantity is the quantity of the product to be settled, and is of type GDT: Quantity.

The elements BaseBusinessTransactionDocumentItemID, BusinessTransactionDocumentItemTypeCode, SettlementRelevanceIndicator, and Quantity is specified (except in the case of group hierarchy items). The soft semantic (ActionCodes "04"/"05") is used for the ActionCode, since the applications receiving the data contain the data subject to settlement from the transmitted item. ActionCode "04" is interpreted by the receiving statement as a change statement for the item to be transmitted, provided that this has already been transmitted by a previous message. If this is not the case, the transmitted item is created. The ActionCode "05" (REMOVE) signalizes to the receiving application that item transmitted previously for a business transaction (and cancelled now) are not relevant for settlement any more. Initially, only inis notformation about the calendar day is used from the ProposedInvoiceDate element; hours, minutes, and seconds are ignored.

Integrity (Regarding the Message Type BillingDueNotification): The element EvaluatedReceiptSettlementIndicator is not used.

Default logic is used for the following elements: SettlementRelevanceIndicator, SettlementBlockedIndicator, DeletedIndicator, and DeliveryDateTimePeriod: if values are not transmitted at InvoiceDueItem level, the values from the InvoiceDue level are used. If values were not transmitted at InvoiceDue and InvoiceDueItem level, the relevant indicators are NOT set. From the DeliveryPeriod element, only the date specified in the StartDateTime attribute is interpreted as being the date on which a service is provided (requested delivery date, date of the goods issue posting); all other information is ignored. From a semantic perspective, InvoiceDueItems can contain other items. This enables item hierarchies to be mapped. The hierarchies are mapped using a ParentItemID and an ItemHierarchyTypeCode.

There are various types of item, which are governed by a variety of integrity conditions. In particular, Standard items are items that are neither above nor below any other items in the hierarchy, Hierarchy items are items that are above other items in the hierarchy, and Subitems are items that are below other items in the hierarchy. The type of subitem and the way it is used is indicated using the ItemHierarchyRelationTypeCode.

(ii) Invoice Due Item Product Information Package

The InvoiceDueItemProductInformation package 40200B groups all information required for identifying, describing, and classifying a product for which an invoice is due. It includes a Product 40230B and a ProductCategory 40232B. There is a 1:c relationship 40234B between the Item entity 40220B and the Product entity 40230B. There is a 1:c relationship 40236B between the Item entity 40220B and the ProductCategory 40232B.

(a) Product

The Product entity 40230B identifies, describes, and classifies a product for which an invoice is due. The Product entity 40230B is of type GDT: Product. A product is specified when the line item instance is not a grouping or unplanned delivery costs.

(b) Product Category

The ProductCategory entity 40232B is the product category of the product/service that is being invoiced. The ProductCategory entity 40232B is of type GDT: ProductCategory. The product category derives directly from the product and can vary if the buyer and seller have assigned the same product to different categories. This is allowed and should be tolerated by the systems involved.

(iii) Invoice Due Item Price Information Package

The InvoiceDueItemPriceInformation package 40202B summarizes all the information about the amount to be settled for a product or a service, including all price components. The InvoiceDueItemPriceInformation package 40202B includes a Price entity 40238B, a NetUnitPrice entity 40246B, and a ProcurementCostUpperLimit entity 40240B. There is a 1:c relationship 40242B between the Item entity 40220B and the Price entity 40238B. There is a 1:c relationship 40244B between the Item entity 40220B and the ProcurementCostUpperLimit entity 40240B. There is a 1:c relationship 40248B between the Price entity 40238B and the NetUnitPrice entity 40246B.

(a) Price

The Price is the amount to be settled for a product or service, including tax and net portions. The Price entity 40238B includes a GrossAmount, a NetAmount, a TaxAmount, an ExchangeRate, and a PricingDate. The GrossAmount is the gross invoice amount; net amount plus tax amount, and is of type GDT: Amount. The NetAmount is the net invoice amount, and is of type GDT: Amount. The TaxAmount is the tax amount of an invoice, and is of type GDT: Amount. The ExchangeRate is the information about the exchange rate, and is of type GDT: ExchangeRate. The PricingDate is the date on which the price is calculated, and is of type GDT: DateTime. The Price entity 40238B also includes a NetUnitPrice entity 40246B.

The elements NetAmount, GrossAmount, and TaxAmount are specified when the specified line item instance is not an item used simply for grouping purposes. The gross and net amounts for an item are in the same currency. If a following currency is specified in the ExchangeRate element, the following currency is the same as the currency of the gross/net amount. If the following and leading currencies are not specified in the ExchangeRate element, the currency of the gross/net amount is set as the following and leading currency (in this case, the exchange rate would be set to the uniform rate). Currencies specified at header/item level are the same.

NetUnitPrice is the net price for the base quantity of a product that was used to calculate the net amount. The NetUnitPrice entity 40246B is of type GDT: Price. For Example, € 10 for 5 pieces.

(b) Procurement Cost Upper Limit

The ProcurementCostUpperLimit is a quantity or value-based restriction placed on a product or service to be settled. The ProcurementCostUpperLimit 40240B is of type GDT: ProcurementCostUpperLimit.

Integrity (Regarding the Message Type BillingDueNotification): The element ProcurementCostUpperLimit is ignored.

(iv) Invoice Due Item Party Package

The InvoiceDueItemParty package 40224 includes a BuyerParty entity 40250B, a SellerParty entity 40252B, a ProductRecipientParty entity 40254B, a VendorParty entity 40256B, a BillToParty entity 40258B, a BillFromParty entity 40260B, a PayerParty entity 40262B, and a PayeeParty entity 40264B. There is a 1:c relationship 40266B between the Item entity 40220B and the BuyerParty 40250B. There is a 1:c relationship 40268B between the Item entity 40220B and the SellerParty 40252B. There is a 1:c relationship 40270B between the Item entity 40220B and the ProductRecipientParty 40254B. There is a 1:c relationship 40272B between the Item entity 40220B and the VendorParty 40256B. There is a 1:c relationship 40274B between the Item entity 40220B and the BillToParty 40258B. There is a 1:c relationship 40276B between the Item entity 40220B and the BillFromParty 40260B. There is a 1:c relationship 40278B between the Item entity 40220B and the PayerParty 40262B. There is a 1:c relationship 40280B between the Item entity 40220B and the PayeeParty 40264B.

The InvoiceDueItemParty package 40224 is similar to the Party package 40208 at the InvoiceDue level. Thus, BuyerParty entity 40250B includes similar Address and Contact entity information 40282B as found for BuyerParty entity 40230 in the Party package 40208. Similarly, SellerParty entity 40252B includes similar Address and Contact entity information 40284B as found for SellerParty entity 40232B in the Party package 40208. Similarly, ProductRecipientParty entity 40254B includes similar Address and Contact entity information 40286B as found for ProductRecipientParty entity 40234B in the Party package 40208. Similarly, VendorParty entity 40256B includes similar Address and Contact entity information 40288B as found for VendorParty entity 40236B in the Party package 40208. Similarly, BillToParty entity 40258B includes similar Address and Contact entity information 40290B as found for BillToParty entity 40238B in the Party package 40208. Similarly, BillFromParty entity 40260B includes similar Address and Contact entity information 40292B as found for BillFromParty entity 40240B in the Party package 40208. Similarly, PayerParty entity 40262B includes similar Address and Contact entity information 40294B as found for PayerParty entity 40242B in the Party package 40208. Similarly, PayeeParty entity 40264B includes similar Address and Contact entity information 40296B as found for PayeeParty entity 40244B in the Party package 40208.

Default logic is used for all business partners: business partners that are specified at InvoiceDue level are used for all the items for which a corresponding partner is not explicitly transmitted. The default logic applies for the partner as a whole, including the contact person. Parts of a partner cannot be specified in more detail at item level. The default logic is only a simplified version of the transmitted message. In terms of logic, partners at InvoiceDue level behave as if they have been explicitly transmitted for all the items of the message.

(v) Invoice Due Item Location Package

The InvoiceDueItemLocation package 40206B includes a ShipToLocation entity 40298B and a ShipFromLocation entity 40200C. The InvoiceDueItemLocation package 40206B may also include an Address entity similar to the Address entity 40236A in the Location Package 40210 at the InvoiceDue level. There is a 1:c relationship 40202C between the Item entity 40220B and the ShipToLocation 40298B. There is a 1:c relationship 40204C between the Item entity 40220B and the ShipFromLocation entity 40200C The InvoiceDueItemLocation package 40206B is similar to the Location package 40210 at InvoiceDue level. Thus, the ShipToLocation entity 40298B contains the same Address entity information 40206C as found associated with ShipToLocation entity 40228A in the Location package 40210. Similarly, the ShipFromLocation entity 40200C contains the same Address entity information 40208C as found associated with ShipFromLocation entity 40230A in the Location package 40210.

(vi) Invoice Due Item Delivery Information Package

The InvoiceDueItemDeliveryInformation package 40208B is similar to the DeliveryInformation package 40212 at InvoiceDue level. The InvoiceDueItemDeliveryInformation package 40208B includes a DeliveryTerms entity 40210C. There is a 1:c relationship 40212C between the Item entity 40220B and the DeliveryTerms entity 40210C.

(vii) Invoice Due Item Payment Information Package

The InvoiceDueItemPaymentInformation package 40210B is similar to the PaymentInformation package 40214 at InvoiceDue level. The InvoiceDueItemPaymentInformation package 40210B includes a CashDiscountTerms entity 40214C and a PaymentForm entity 40216C. There is a 1:c relationship 40218C between the Item entity 40220B and the CashDiscountTerms entity 40214C. There is a 1:c relationship 40220C between the Item entity 40220B and the PaymentForm entity 40216C. The default logic used for CashDiscountTerms and the PaymentForm is similar to that used for Parties. In exemplary embodiments, the PaymentInformation package 40210B also includes a MaximumDiscount entity 40222C, a NormalDiscount entity 40224C, and a PaymentCard entity 40230C. There is a 1:c relationship 40226C between the CashDiscountTerms entity 40214C and the MaximumDiscount entity 40222C. There is a 1:c relationship 40228C between the CashDiscountTerms entity 40214C and the NormalDiscount entity 40224C. There is a 1:c relationship 40232C between the PaymentForm entity 40216C and the PaymentCard entity 40230C.

(viii) Invoice Due Item Business Transaction Document Reference Package

The InvoiceDueItemBusinessTransactionDocumentReference package 40212B groups all references to business documents that could be relevant for settling an InvoiceDueItem. The InvoiceDueItemBusinessTransactionDocumentReference package 40212B includes a PurchaseOrderReference entity 40234C, a SalesOrderReference entity 40236C, a DeliveryReference entity 40238C, a PurchaseContractReference entity 40240C, a SalesContractReference entity 40242C, a BuyerProductCatalogueReference entity 40244C, and a SellerProductCatalogueReference entity 40246C. There is a 1:c relationship 40248C between the Item entity 40220B and the PurchaseOrderReference entity 40248C. There is a 1:c relationship 40250C between the Item entity 40220B and the SalesOrderReference entity 40236C. There is a 1:c relationship 40252C between the Item entity 40220B and the DeliveryReference entity 40238C. There is a 1:c relationship 40254C between the Item entity 40220B and the PurchaseContractReference entity 40240C. There is a 1:c relationship 40256C between the Item entity 40220B and the SalesContractReference entity 40242C. There is a 1:c relationship 40258C between the Item entity 40220B and the BuyerProductCatalogueReference entity 40244C. There is a 1:c relationship 40260C between the Item entity 40220B and the VendorProductCatalogueReference entity 40246C.

(a) Purchase Order Reference

A PurchaseOrderReference is the reference to a purchase order or to an item within a purchase order. The PurchaseOrderReference entity is of type GDT: BusinessTransactionDocumentReference. The PurchaseOrderReference entity is transmitted in the BillingDueNotification from CRM Sales to Billing so that it can be output together with the invoice. The PurchaseOrderReference entity includes the purchase order number assigned by the buyer.

(b) Sales Order Reference

A SalesOrderReference is the reference to an order or an item within an order. The SalesOrderReference entity is of type GDT: BusinessTransactionDocumentReference. The SalesOrderReference entity is to be transmitted in the InvoicingDueNotification from SRM Procurement to Invoicing when the procurement system knows what the order number is (e.g., using the PurchaseOrderConfirmation). The SalesOrderReference entity includes the order number assigned by the seller.

(c) Delivery Reference

A DeliveryReference is the reference to a delivery (delivery note number) or an item within a delivery. The DeliveryReference entity is of type GDT: BusinessTransactionDocumentReference.

Integrity (Regarding the Message Type InvoicingDueNotification): The DeliveryReference entity is to be transmitted in the InvoicingDueNotification from Supply Chain Execution to Invoicing when the vendor delivery note number is known.

The DeliveryReference entity includes the delivery note number assigned by the seller.

(d) Purchase Contract Reference

A PurchaseContractReference is the reference to a purchase contract or to an item within a purchase contract. The PurchaseContractReference entity is of type GDT: BusinessTransactionDocumentReference. Provided there is no agreement to the contrary, the seller is responsible for determining the correct SellerContractReference for a corresponding BuyerContractReference.

(e) Sales Contract Reference

A SalesContractReference is the reference to a sales contract or to an item within a sales contract. The SalesContractReference entity is of type GDT: BusinessTransactionDocumentReference.

(f) Buyer Product Catalogue Reference

A BuyerProductCatalogueReference is the reference to a buyer's product catalog or to an item within this catalog. The BuyerProductCatalogueReference entity is of type GDT: CatalogueReference. The BuyerProductCatalogueReference entity is always to be filled when an invoice item refers to a catalog whose number and whose item numbers were assigned by the buyer.

(g) Seller Product Catalogue Reference

A SellerProductCatalogueReference is the reference to a seller's product catalog or to an item within this catalog. The SellerProductCatalogueReference entity is of type GDT: CatalogueReference. SellerProductCatalogueReference is always to be filled when an invoice item refers to a catalog whose number and whose item numbers were assigned by the seller.

(ix) Invoice Due Item Account Assignment Package

The InvoiceDueItemAccountAssignment package 40214B is similar to the AccountAssignment package 40218 at InvoiceDue level. The AccountAssignment package 40214B groups account assignment information for accounting. The AccountAssignment package 40214B includes an AccountAssignment entity 40262C. There is a 1:nc relationship 40264C between the Item entity 40220B and the AccountAssignment entity 40262C.

The AccountAssignment package 40214B includes all information about the account assignment objects in accounting to which the base business transaction refers. The account assignment can be distributed to various objects (such as the cost center or order) on a percentage basis. In this case, the total of the account assignments is 100%. The default logic used for the AccountAssignment package 40214B is similar to that used for Parties.

An AccountAssignment provides information about an account assignment object and the percentage rate to be used. The AccountAssignment entity 40262C is of type GDT: AccountingObjectSetDistribution.

(x) Invoice Due Item Attachment Package

The InvoiceDueItemAttachment package 40216B is similar to the Attachment package 40220 at InvoiceDue level. The InvoiceDueItemAttachment package 40216B groups all attachment information regarding the settlement process. InvoiceDueItemAttachment package 40216B includes an Attachment entity 40266C. There is a 1:cn relationship 40268C between the Item entity 40220B and the Attachment entity 40266C.

The AttachmentWebAddress is a web address for a document of any type that relates to a settlement. The AttachmentWebAddress entity 40266C is of type GDT: AttachmentWebAddress.

(xi) Invoice Due Item Description Package

The InvoiceDueItemDescription package 40218B is similar to the Description package 40222 at InvoiceDue level. The Description package 40218B groups all explanatory texts regarding a settlement. It includes a Description entity 40270C. There is a 1:c relationship 40272C between the Item entity 40220B and the Description entity 40270C.

The Description is natural-language text with additional information about a settlement. The Description entity 40270C is of type GDT: Description.

(4) Message Data Type Data Model InvoiceDueCancellationRequest

FIG. 403 depicts a data model for the InvoiceDueCancellationRequest process. The message data type InvoiceDueCancellationMessage includes an InvoiceDueCancellationMessage package 40302, which contains the InvoiceDueCancellation object contained in the business document and the business information that is relevant for sending a business document in a message. The InvoiceDueCancellationMessage package 40302 includes a MessageHeader package 40304, an InvoiceDueCancellation package 40306, and an InvoiceDueCancellationMessage entity 40308.

The message data type InvoiceDueCancellationMessage makes the structure available for the following message types: InvoicingDueCancellationRequest, BillingDueCancellationRequest and the relevant interfaces.

(a) MessageHeader Package

The MessageHeader package 40304 groups together the business information that is relevant for sending a business document in a message. The MessageHeader package 40304 is similar to the MessageHeader package 40202 in the InvoiceDueMessage package 40200.

(b) InvoiceDueCancellation Package

The InvoiceDueCancellation package 40306 groups together information that is required to completely cancel an InvoiceDueMessage that has already been sent and to cancel the settlement process. The InvoiceDueCancellation package 40306 includes the InvoiceDueCancellation entity 40310. There is a 1:1 relationship 40312 between the InvoiceDueCancellationMessage entity 40308 and the InvoiceDueCancellation entity 40310.

(c) InvoiceDueCancellation

The InvoiceDueCancellation entity 40310 is a request to exclude business document data that has already been sent from the settlement. The InvoiceDueCancellation 40310 includes a BaseBusinessTransactionDocumentID and a BaseBusinessTransactionDocumentTypeCode. The BaseBusinessTransactionDocumentID is a unique identifier for a base business document for an InvoiceDue Message that has already been sent. It has a data type GDT: Business TransactionDocumentID. The BaseBusinessTransactionDocumentTypeCode is a coded representation of the type of the base business document for an InvoiceDueMessage that has already been sent. The BaseBusinessTransactionDocumentTypeCode has a data type of GDT: BaseBusinessTransactionDocumentTypeCode.

(5) Message Data Type Element Structure

FIG. 404 depicts the element structure for InvoicingDueMessage. The element structure identifies the different packages 40400 in the interface, and represents the entities at various levels within the interface. As shown in FIG. 404, the interface for InvoicingDueRequest includes five levels 40402, 40404, 40406, 40408, 40410. The element structure identifies the number of occurrences 40412 of each element and provides a Datatype name 40414 for each element.

The outermost package of this interface is InvoiceDueMessage package 40416, which includes a InvoiceDueMessage entity 40418 at the first level 40402. The InvoiceDueMessage entity 40418 is of data type MDT: InvoiceDueMessage 40420.

The InvoiceDueMessage package 40416 includes an InvoiceDue package 40422, which includes an InvoiceDue entity 40424 at the second level 40404. The InvoiceDue entity 40424 has one occurrence 40426 and is of data type InvoiceDue 40428.

The InvoiceDue entity 40424 includes a BaseBusinessTransactionDocumentID 40430, a BaseBusinessDocumentTypeCode 40436, a SettlementPriorityCode 40442, a SettlementRelevanceIndicator 40448, a SettlementBlockedIndicator 40454, an ItemListCompleteTransmissionIndicator 40460, a PlannedBillingDate 40466, a DeliveryPeriod 40472, and a ProposedInvoiceDate 40478 at the third level 40406. The BaseBusinessTransactionDocumentID 40430 has one occurrence 40432 and is of data type GDT:BusinessTransaction DocumentID 40434. The BaseBusinessDocumentTypeCode 40436 has one occurrence 40438 and is of data type GDT:BusinessTransaction DocumentTypeCode 40440. The SettlementPriorityCode 40442 has zero or one occurrence 40444 and is of data type GDT:BusinessTransaction Priority Code 40446. The Settlement Relevance Indicator 40448 has zero or one occurrence 40450 and is of data type GDT:BusinessTransaction DocumentSettlement RelevanceIndicator 40452. The SettlementBlockedIndicator 40454 has zero or one occurrence 40456 and is of data type GDT:BusinessTransactionBlockedIndicator 40458. The ItemListCompleteTransmission Indicator 40460 has zero or one occurrence 40462 and is of data type GDT:CompleteTransmissionIndicator 40464. The PlannedBilling Date 40466 has zero or one occurrence 40468 and is of data type GDT:Date 40470. The DeliveryPeriod 40472 has zero or one occurrence 40474 and is of data type GDT:DateTimePeriod 40476. The ProposedInvoiceDate 40478 has zero or one occurrence 40480 and is of data type GDT:DateTime 40482.

The InvoiceDue package 40422 includes a Party package 40484, a Location package 40486, a Delivery Information package 40488, a Payment Information package 40490, a Price Information package 40492, an Account Assignment package 40494, an Attachment package 40496, a Description package 40498, and an Item package 40400A.

The Party package 40484 includes a BuyerParty entity 40402A, a SellerParty entity 40408A, a ProductRecipientParty entity 40414A, a VendorParty entity 40420A, a BillToParty entity 40426A, a BillFromParty entity 40432A, a PayerParty entity 40438A, and a PayeeParty entity 40444A at the third level 40406. The BuyerParty entity 40402A has zero or one occurrence 40404A and a data type of GDT:BusinessTransactionDocumentParty 40406A. The SellerParty entity 40408A has zero or one occurrence 40410A and a data type of GDT:BusinessTransaction DocumentParty 40412A. The ProductRecipientParty entity 40414A has zero or one occurrence 40416A and a data type of GDT:BusinessTransactionDocumentParty 40418A. The VendorParty entity 40420A has zero or one occurrence 40422A and a data type of GDT:BusinessTransactionDocumentParty 40424A. The BillToParty entity 40426A has zero or one occurrence 40428A and a data type of GDT:BusinessTransactionDocumentParty 40430A. The BillFromParty entity 40432A has zero or one occurrence 40434A and a data type of GDT: BusinessTransactionDocumentParty 40436A. The PayerParty entity 40438A has zero or one occurrence 40440A and a data type of GDT:BusinessTransactionDocumentParty 40442A. The PayeeParty entity 40444A has zero or one occurrence 40446A and a data type of GDT:BusinessTransactionDocument Party 40448A.

The Location package 40486 includes a ShipToLocation entity 40450A and a ShipFromLocation entity 40456A at the third level 40406. The ShipToLocation entity 40450A has zero or one occurrence 40452A and a data type of GDT: BusinessTransaction DocumentLocation 40454A. The ShipFromLocation entity 40456A has zero or one occurrence 40458A and a data type of GDT:BusinessTransactionDocumentLocation 40460A.

The DeliveryInformation package 40488 includes a DeliveryTerms entity 40462A at the third level 40406, which has zero or one occurrences 40464A and a data type of GDT: DeliveryTerms 40466A.

The PaymentInformation package 40490 includes a CashDiscountTerms entity 40468A and a PaymentForm entity 40474A at the third level 40406. The CashDiscountTerms entity 40468A has zero or one occurrences 40470A and a data type of GDT:CashDiscountTerms 40472A. The PaymentForm entity 40474A has zero or one occurrences 40476A and a data type of GDT:PaymentForm 40478A.

The PriceInformation package 40492 includes a Price entity 40480A at the third level 40406, which has zero or one occurrences 40482A. The Price entity 40480A includes a GrossAmount 40484A, a NetAmount 40490A, a TaxAmount 40496A, an ExchangeRate 40402B, and a PricingDate 40408B at the fourth level 40408. The GrossAmount 40484A has zero or one occurrences 40486A and a data type of GDT: Amount 40488A. The NetAmount 40490A has zero or one occurrences 40492A and a data type of GDT: Amount 40494A. The TaxAmount 40496A has zero or one occurrences 40498A and a data type of GDT:Amount 40400B. The ExchangeRate 40402B has zero or one occurrences 40404B and a data type of GDT:ExchangeDate 40406B. The PricingDate 40408B has zero or one occurrences 40410B and a data type of GDT:DateTime 40412B.

The AccountAssignment package 40494 includes an AccountAssignment entity 40414B at the third level 40406, which has zero or one occurrences 40416B and a data type of ???GDT: AccountingObjectSetDistribution ??? (zu zeit nicht relevant) 40418B.

The Attachment package 40496 includes an AttachmentWebAddress entity 40420B at the third level 40406, which has any number of occurrences 40422B and a data type of GDT: AttachmentWebAddress 40424B.

The Description package 40498 includes a Description entity 40426B at the third level 40406, which has zero or one occurrences 40428B and a data type of GDT: Description 40430B.

The Item package 40400A has an Item entity 40432B at the third level 40406, which has at least one occurrence 40434B and a data type of GDT: InvoiceDueItem 40436B. The Item entity 40432B includes a BaseBusinessTransaction DocumentItemID 40438B, a BaseBusinessTransaction DocumentItemTypeCode 40444B, a BaseBusinessTransaction DocumentItemDeletedIndicator 40450B, a SettlementRelevanceIndicator 40455B, an EvaluatedReceiptSettlementIndicator 40460B, a SettlementBlockedIndicator 40466B, a PricingIndicator 40472B, a PlannedBillingDate 40478B, a ProposedInvoiceDate 40484B, and a Hierarchy Relationship 40490B at the fourth level 40408.

The BaseBusinessTransaction DocumentItemID 40438B has one occurrence 40440B and a data type of GDT:BusinessTransactionDocument ItemID 40442B. The BaseBusinessTransactionDocumentItemTypeCode 40444B has one occurrence 40446B and a data type of GDT:BusinessTransactionDocument ItemTypeCode 40448B. The BaseBusinessTransactionDocumentItemDeletedIndicator 40450B has one occurrence 40452B and a data type of GDT:Deleted Indicator 40454B. The SettlementRelevanceIndicator 40455B has zero or one occurrences 40456B and a data type of GDT: BusinessTransactionDocument SettlementRelevanceIndicator 40458B. The EvaluatedReceiptSettlement Indicator 40460B has zero or one occurrences 40462B and a data type of GDT:EvaluatedReceiptSettlementIndicator 40464B. The SettlementBlockedIndicator 40466B has zero or one occurrences 40468B and a data type of GDT:BusinessTransactionBlockedIndicator 40470B. The PricingIndicator 40472B has zero or one occurrences 40474B and a data type of GDT: BusinessTransactionDocument PricingIndicator 40476B. The PlannedBillingDate 40478B has zero or one occurrences 40480B and a data type of GDT:Date 40482B. The ProposedInvoiceDate 40484B has zero or one occurrences 40486B and a data type of GDT:DateTime 40488B.

The Hierarchy Relationship 40490B has zero or one occurrences 40492B and includes a ParentItemID 40494B and a TypeCode 40400C at the fifth level 40410. The ParentItemID 40494B has one occurrence 40496B and a data type of GDT: BusinessTransactionDocumentItemID 40498B. The TypeCode 40400C has one occurrence 40402C and a data type of GDT: BusinessTransactionDocumentItemHierarchyRelationshipTypeCode 40403 C.

The Item package 40400A includes a ProductInformation package 40404C, a PriceInformation package 40406C, a Party package 40408C, a Location package 40410C, a DeliveryInformation package 40412C, a PaymentInformation package 40414C, a BusinessTransactionDocumentReference package 40416C, an AccountAssignement package 40418C, an Attachment package 40420C, and a Description package 40422C.

The ProductInformation package 40404C includes a Product entity 40424C, a ProductCategory entity 40430C, a DeliveryDateTimePeriod entity 40436C, and a Quantity entity 40442C at the fourth level 40408. The Product entity 40424C has zero or one occurrences 40426C and a data type of GDT: BusinessTransactionDocument Product 40428C. The ProductCategory entity 40430C has zero or one occurrences 40432C and a data type of GDT:ProductCategory 40434C. The DeliveryDateTimePeriod entity 40436C has zero or one occurrences 40438C and a data type of GDT:DateTimePeriod 40440C. The Quantity entity 40442C has one occurrence 40444C and a data type of GDT:Quantity 40446C.

The PriceInformation package 40406C includes a Price entity 40448C and a ProcurementCostUpperLimt 40488C at the fourth level 40408. The Price entity 40448C has zero or one occurrences 40450C. The ProcurementCostUpperLimit 40488C has zero or one occurrences 40490C and a data type of GDT: ProcurementCostUpperLimit 40492C.

The Price entity 40448C includes a GrossAmount 40452C, a NetAmount 40458C, a TaxAmount 40464C, a ExchangeRate 40470C, a PricingDate 40476C, and a NetUnitPrice 40482C at the fifth level 40410. The GrossAmount 40452C has zero or one occurrences 40454C and a data type of GDT: Amount 40456C. The NetAmount 40458C has zero or one occurrences 40460C and a data type of GDT:Amount 40462C. The TaxAmount 40464C has zero or one occurrences 40466C and a data type of GDT:Amount 40468C. The ExchangeRate 40470C has zero or one occurrences 40472C and a data type of GDT:ExchangeRate 40474C. The PricingDate 40476C has zero or one occurrences 40478C and a data type of GDT:DateTime 40480C. The NetUnitPrice 40482C has zero or one occurrences 40484C and a data type of GDT: Price 40486C.

The Party package 40408C includes a BuyerParty entity 40494C, a SellerParty entity 40400D, a ProductRecipientParty entity 40406D, a VendorParty entity 40412D, a BillToParty entity 40418D, a BillFromParty entity 40424D, a PayerParty entity 40430D, and a PayeeParty entity 40436D at the fourth level 40408. The BuyerParty entity 40494C has zero or one occurrences 40496C and a data type of GDT:BusinessTransactionDocumentParty 40498C. The SellerParty entity 40400D has zero or one occurrences 40402D and a data type of GDT:BusinessTransactionDocumentParty 40404D. The ProductRecipientParty entity 40406D has zero or one occurrences 40408D and a data type of GDT:BusinessTransactionDocumentParty 40410D. The VendorParty entity 40412D has zero or one occurrences 40414D and a data type of GDT:BusinessTransactionDocumentParty 40416D. The BillToParty entity 40418D has zero or one occurrences 40420D and a data type of GDT:BusinessTransactionDocumentParty 40422D. The BillFromParty entity 40424D has zero or one occurrences 40426D and a data type of GDT: BusinessTransactionDocumentParty 40428D. The PayerParty entity 40430D has zero or one occurrences 40432D and a data type of GDT:BusinessTransactionDocumentParty 40434D. The PayeeParty entity 40436D has zero or one occurrences 40438D and a data type of GDT:BusinessTransactionDocumentParty 40440D.

The Location package 40410C includes a ShipToLocation entity 40442D and a ShipFromLocation entity 40448D at the fourth level 40408. The ShipToLocation entity 40442D has zero or one occurrences 40444D and a data type of GDT: BusinessTransactionDocumentLocation 40446D. The ShipFromLocation entity 40448D has zero or one occurrence 40450D and a data type of GDT:BusinessTransactionDocument Location 40452D.

The DeliveryInformation package 40412C includes a DeliveryTerms entity 40454D at the fourth level 40408, which has zero or one occurrences 40456D and a data type of GDT:DeliveryTerms 40458D.

The PaymentInformation package 40414C includes a CashDiscountTerms entity 40460D and a PaymentForm entity 40466D at the fourth level 40408. The CashDiscountTerms entity 40460D has zero or one occurrences 40462D and a data type of GDT:CashDiscountTerms 40464D. The PaymentForm entity 40466D has zero or one occurrences 40468D and a data type of GDT:PaymentFormCode 40470D.

The BusinessTransactionDocumentReference package 40416C includes a PurchaseOrder Reference entity 40472D, a SalesOrderReference entity 40478D, a DeliveryReference entity 40484D, a PurchaseContract Reference entity 40490D, a SalesContract Reference entity 40496D, a BuyerProduct CatalogueReference entity 40402E, and a SellerProduct CatalogueReference entity 40408E. The PurchaseOrder Reference entity 40472D has zero or one occurrences 40474D and a data type of GDT:BusinessTransactionDocumentReference 40476D. The SalesOrderReference entity 40478D has zero or one occurrences 40480D and a data type of GDT:BusinessTransactionDocumentReference 40482D. The DeliveryReference entity 40484D has zero or one occurrences 40486D and a data type of GDT:BusinessTransactionDocumentReference 40488D. The PurchaseContractReference entity 40490D has zero or one occurrences 40492D and a data type of GDT:BusinessTransactionDocumentReference 40494D. The SalesContractReference entity 40496D has zero or one occurrences 40498D and a data type of GDT:BusinessTransactionDocumentReference 40400E. The BuyerProductCatalogueReference entity 40402E has zero or one occurrences 40404E and a data type of GDT: CatalogueReference 40406E. The SellerProductCatalogueReference entity 40408E has zero or one occurrences 40410E and a data type of GDT:CatalogueReference 40412E.

The AccountAssignment package 40418C includes an AccountAssignment entity 40414E at the fourth level 40408, which has zero or one occurrences 40416E and a data type of ???GDT: AccountingObjectSetDistribution ??? (zu zeit nicht relevant) 40418E.

The Attachment package 40420C includes an AttachmentWebAddress entity 40420E at the fourth level 40408, which has any number or occurrences 40422E and a data type of GDT: AttachmentWebAddress 40424E.

The Description package 40422C includes a Description entity 40426E at the fourth level 40408, which has zero or one occurrences 40428E and a data type of GDT: Description 40430E.

o) Inventory Change Interfaces

Inventory change interfaces are interfaces that may be used to transfer information about stock changes in stockholding to interested applications, such as Logistics Planning (SCP) or Accounting. In an embodiment, the inventory change interfaces include the InventoryChangeNotification interface and the InventoryChangeAccountingNotification interface.

The motivating business scenarios for the InventoryChangeNotification and InventoryChangeAccountingNotification interfaces may be the Sell From Stock (SFS), Procure To Stock (PTS), and Physical Inventory scenarios. Goods are received in the PTS scenario and issued in the SFS scenario. In the Physical Inventory scenario, inventory differences can result in stock changes. All three scenarios can generally be grouped together as stock changes (InventoryChange). Information about stock changes is relevant to Accounting, as well as to other applications, such as Logistics Planning. Therefore, the InventoryChangeAccountingNotification message can be transferred to Accounting. To inform interested applications such as Planning, the InventoryChangeNotification message can be sent. In an embodiment, the content of the messages is prepared in Inventory Management (SCE) based on a set of rules tailored to the receiving service. For instance, in the case of stock transfers within the warehouse or changes in the stock of non-valuated material, the information may be sent to Planning but not to Accounting. The information may be sent at different times, depending on the receiving service. In an example, the information may be sent promptly to Planning, whereas Accounting is informed after a delay (such as once a month). In addition, the extent to which information is summarized in this scenario depends on the receiving service. If an order involves partial deliveries, Planning is informed of every single stock change resulting from each partial delivery. In contrast, Accounting is informed later of the total quantity delivered. Consequently, individual items of n InventoryChangeNotification messages sent at different times correspond to one item in an InventoryChangeAccountingNotification message. In an embodiment, SAP Business Information Warehouse (BW) could also be integrated later using another InventoryChange message (this message would be based on the same message data type, InventoryChangeMessage, as the messages described here). In this case, the information about stock changes may be summarized (for example, the sum of the goods issued for a material in a particular plant on a certain day).

(1) Message Types (a) Inventory Change Notification

An InventoryChangeNotification summarizes detailed information about stock changes in stockholding that may be required for Logistics Planning. The message type InventoryChangeNotification is based on the message data type InventoryChangeMessage.

(b) Inventory Change Accounting Notification

An InventoryChangeAccountingNotification summarizes aggregated information about stock changes in stockholding that may be required for Accounting. The message type InventoryChangeAccountingNotification is based on the message data type InventoryChangeMessage.

(2) Message Choreography

FIG. 405 depicts a graphical representation 40500 of an InventoryChangeNotification 40508 and an InventoryChangeAccountingNotification 40510 between business entities in accordance with methods and systems consistent with the present invention. The illustrative message choreography is a logical sequence of messages that is not dependent on actual scenarios. In the implementation shown in FIG. 405, the illustrative business entities include a stockholder (or Inventory Management 40502), a logistics planner (or Logistics Planning 40504), and an accountant (or Accounting 40506). In the illustrative example, Inventory Management 40502 informs interested applications, such as Logistics Planning 40504 (using InventoryChangeNotification 40508 message) or Accounting 40506 (using InventoryChangeAccountingNotification 40510), about stock changes. This information can also be cancelled by reference, in which Inventory Management 40502 sends an InventoryChangeAccountingCancellationNotification 40512 message to Accounting 40506. The reference to the original document (prima nota) can also be used in Accounting as an audit trail.

(3) Message Data Type Inventory Change Message

The message data type InventoryChangeMessage 40600 includes the InventoryChangeMessage object 40606 included in the business document and the business information that is relevant for sending a business document in a message. It includes a MessageHeader Package 40602 and an InventoryChange Package 40604. The message data type InventoryChangeMessage 40600 makes the structure available for the message type InventoryChange 40606 and the relevant interfaces InventoryChangeNotification 40508, InventoryChangeAccountingNotification 40510, and InventoryChangeAccountingCancellationRequest 40512.

(a) Message Header Package

A MessageHeader package 40602 groups together the business information that is relevant for sending a business document in a message. In one implementation, the MessageHeader package 40602 may not be relevant for implementing the InventoryChangeNotification 40508, InventoryChangeAccountingNotification 40510, or InventoryChangeAccountingCancellationRequest 40512.

(b) Inventory Change Package

The InventoryChange package 40604 summarizes changes in warehouse stock. It includes an InventoryChangeItem package 40608 and an InventoryChange entity 40610. There is a 1:1 relationship 40612 between the InventoryChangeMessage object 40606 and the InventoryChange entity 40610.

(i) Inventory Change

The InventoryChange entity 40610 summarizes changes in warehouse stock. An InventoryChange 40610 consists of individual changes in warehouse stock which Accounting or Logistics Planning is informed of. The stock changes summarized in a message may be of the same transaction type (goods receipt, goods issue, physical stock, transfer posting, and the like).

InventoryChange 40610 includes an ID and a BusinessTransactionTypeCode. The ID is a unique identifier of InventoryChange 40610, and is of type GDT: BusinessTransactionDocumentID. The BusinessTransactionTypeCode is the type of business transaction that caused the stock change, and is of type GDT: BusinessTransactionTypeCode.

In stockholding, the term "stock" refers to a certain quantity of a material kept in a particular location. Usually, other attributes are used to define the stock more precisely. The stock posted can differ from the physical warehouse stock but this can be corrected by physical inventories.

In an embodiment, a distinction can be made between external stock changes (goods receipt and issue) and internal stock changes (physical stock, stock transfer, and transfer posting). Stock changes are characterized by the difference between the (internal) stock prior to the change and the (internal) stock after the change. From the (internal) perspective of stockholding, each stock change involves an issue (outbound) or a receipt (inbound). In the case of goods receipt, a receipt is specified, whereas goods issue specifies an issue. Internal stock changes involve both an issue and a receipt. A stock change is transferred to Logistics Planning and Accounting as an item in an InventoryChangeNotification or an InventoryChangeAccountingNotification, respectively.

(ii) Inventory Change Item Package

The InventoryChangeItem package 40608 summarizes information about an individual warehouse stock change. It includes an InventoryChangeItem entity 40620, an InventoryChangeItemOutbound package 40614, an InventoryChangeItemInbound package 40616, and an InventoryChangeItemBusinessTransactionDocumentReference package 40618. In an embodiment, the InventoryChangeItem package 40608 may also include an InventoryChangeItemAccountingAssignment, which includes account assignment information for an individual warehouse stock change, such as the cost center.

InventoryChangeItem entity 40620 is an individual warehouse stock change. There is a 1:n 40622 relationship between InventoryChange entity 40610 and InventoryChangeItem entity 40620. An InventoryChangeItem entity 40620 includes an ID, a DateTime, and a Note. The ID is the item number, and is of type GDT: BusinessTransactionDocumentItemID. The DateTime is the date and time of the stock change, and is of type GDT: DateTime. The Note is a note about the stock change, and is of type GDT: Note.

(iii) Inventory Change Item Outbound Package

The InventoryChangeItemOutbound package 40614 summarizes information about an issue of warehouse stock. It includes an InventoryChangeItemOutbound entity 40624, a Location 40626, a Product 40628, and an OwnerParty 40630. There is a 1:c 40632 relationship between InventoryChangeItem 40620 and InventoryChangeItemOutbound entity 40624. There is a 1:n 40634 between InventoryChangeItemOutbound 40624 and Location 40626. There is a 1:1 40636 relationship between InventoryChangeItemOutbound 40624 and Product 40628. There is a 1:1 relationship 40638 between InventoryChangeItemOutbound 40624 and OwnerParty 40630.

(a) Inventory Change Item Outbound

An InventoryChangeItemOutbound 40624 characterizes an issue of warehouse stock by means of the ship-from location, issuing owner, issued quantity, and issued material. An InventoryChangeItemOutbound 40624 includes an InventoryUsabilityStatusCode, a ValuationQuantity, an OrderingQuantity, and an AdditionalQuantity. The InventoryUsabilityStatusCode is the usability of the stock for the company-specific business processes, and is of type GDT: InventoryUsabilityStatusCode. The ValuationQuantity is the quantity of the stock change expressed in the unit that Accounting uses to valuate stock, and is of type GDT: Quantity. The OrderingQuantity is the quantity of the stock change expressed in the unit of the purchase order (not to be confused with the ordered quantity), and is of type GDT: Quantity. The AdditionalQuantity is the quantity of the stock change in additional units used to manage stock, and is of type GDT: Quantity.

For the message data type InventoryChangeMessage, in an embodiment, an issue of warehouse stock is specified when goods are issued and internal stock changes occur but not when goods are received. For the message data type InventoryChangeAccounting Notification, the element AdditionalQuantity may be empty.

The stock of a material may be managed in several units of measure. A fixed conversion factor can exist between these units of measure (such as "gallons" and "liters"). This can be material-specific ("kg" and "liter") or general (material "pork halves" in the units of measure "piece" and "kg"). This information may be relevant for subsequent applications in the business process chain, such as Planning. In an embodiment, the moved quantities expressed in the order unit and the valuation unit of measure are relevant to Accounting. The units of measure that are permitted and used to specify the quantities can be established on the basis of the combination of material and location in each case. For instance, the material "crude oil" can be valuated in the unit of measure "liter" for the location "Hamburg" and in the unit of measure "gallon" for the location "Dallas."

Transfer postings can be made in which the InventoryUsability of the stock changes. In this case, the ship-from location, issue owner, issue quantity, and issue material are the same as for the receiving location, receipt owner, receipt quantity, and receipt material, but the issue InventoryUsability may differ from the receipt InventoryUsability.

(b) Location

A Location 40626 is the outbound location of a warehouse stock change. Location 40626 is of type GDT: BusinessTransactionDocumentLocation for which InternalID is used.

In the context of the InventoryChangeAccountingMessage, the location is the particular, valuation-relevant location of a stock change. In the context of the InventoryChangeMessage, the location may be the complete (hierarchical) specification of the location of a stock change.

Since stockholding generally uses a very fine-grained location structure (such as "storage bin 17-05-72"), this location is to be assigned to the valuation-relevant location (such as "plant 072 in Hamburg") prior to filling the InventoryChangeAccountingNotification message, as this information is of significance to Accounting. On the other hand, the entire location (such as "plant 072 in Hamburg," "warehouse 42," "storage bin 17-05-72") may be specified in the InventoryChangeNotification message, since this is of relevance to subsequent applications in the business process chain, such as Planning.

(c) Product

A Product 40628 is the issue material of a warehouse stock change. Product 40628 is of type GDT: BusinessTransactionDocumentProduct for which InternalID is used. In an embodiment, a material is a physical object which forms part of the business activity. In an embodiment, a material is traded, used during production, consumed, or produced. In particular, a material may be a product.

(d) Owner Party

An OwnerParty 40630 is the owner of the issue stock in a warehouse stock change. OwnerParty is of type GDT: BusinessTransactionDocumentParty for which InternalID is used.

(iv) Inventory Change Item Inbound Package

The InventoryChangeItemInbound package 40616 summarizes information about a receipt of warehouse stock. It includes an InventoryChangeItemInbound 40640, a Location 40642, a Product 40644, and an OwnerParty 40646. There is a 1:c 40648 relationship between InventoryChangeItem 40620 and InventoryChangeItemInbound 40640. There is a 1:n 40650 relationship between InventoryChangeItemInbound 40640 and Location 40642. There is a 1:1 40652 relationship between InventoryChangeItemInbound 40640 and Product 40644. There is a 1:1 40654 relationship between InventoryChangeItemInbound 40640 and OwnerParty 40646.

(a) Inventory Change Item Inbound

An InventoryChangeItemInbound 40640 characterizes a receipt of warehouse stock by means of the receiving location, receiving owner, received quantity, and received material. In the context of an InventoryChangeMessage, in an embodiment, a receipt of warehouse stock is specified when goods are received and internal stock changes occur but not when goods are issued. In the context of an InventoryChangeAccountingNotification, the element AdditionalQuantity may be empty.

(b) Location

A Location 40642 is the inbound location of a warehouse stock change. Location 40642 is of type GDT: BusinessTransactionDocumentLocation for which InternalID is used.

(c) Product

A Product 40644 is the receipt material of a warehouse stock change. Product 40644 is of type GDT: BusinessTransactionDocumentProduct for which InternalID is used.

(d) Owner Party

An OwnerParty 40646 is the owner of the receipt stock in a warehouse stock change. OwnerParty 40646 is of type GDT: BusinessTransactionDocumentParty for which InternalID is used.

(v) Inventory Change Item Business Transaction Document Reference Package

The InventoryChangeItemBusinessTransactionDocumentReference package 40618 summarizes the unique references to item lines in other documents, which are relevant in the business process for warehouse stock changes. It includes a SalesOrderReference 40656 and a PurchaseOrderReference 40658. If other scenarios, such as physical inventory, are to be mapped, additional elements could be required in this package. There is a 1:c relationship 40660 between InventoryChangeItem 40620 and SalesOrderReference 40656. There is a 1:c relationship 40662 between InventoryChangeItem 40620 and PurchaseOrderReference 40658.

(a) Sales Order Reference

A SalesOrderReference 40656 is a reference to a sales order item that triggered the change in warehouse stock. The SalesOrderReference 40656 is of type GDT: BusinessTransactionDocumentReference. The SalesOrderReference 40656 is filled in the case of a goods issue for a sales order. Subsequent applications in the business process chain may require this information to create the business context of the stock change (such as for account determination in Accounting).

(b) Purchase Order Reference

A PurchaseOrderReference 40658 is a reference to a purchase order item that triggered the stock change. The PurchaseOrderReference 40658 is of type GDT: BusinessTransactionDocumentReference. The PurchaseOrderReference 40658 is filled in the case of a goods receipt for a purchase order. Subsequent applications in the business process chain may require this information to create the business context of the stock change (such as for account determination in Accounting).

(4) Message Data Type Element Structure

FIGS. 407A-D depict the element structure for the Inventory Change, such as the InventoryChangeNotification and InventoryChangeAccountingNotification. The element structure is similar to the above described data model of the Inventory Change as reflected in FIG. 406, but provides additional information regarding the details for interfacing with or implementing an Inventory Change. As shown in FIGS. 407A-D, the element structure identifies the different packages 40700 that may be in a respective Inventory Change. The element structure for the Inventory Change includes six levels 40702, 40704, 40706, 40708, 40710, and 40712 associated with a respective package 40700. The element structure for an Inventory Change also identifies the cardinality 40714 and data type 40716 for the elements at respective levels 40702, 40704, 40706, 40708, 40710, and 40712 in a package 40700.

The outermost package of this interface is an InventoryChangeMessage package 40718, which includes an InventoryChangeMessage entity 40720 at the first level 40702. The InventoryChangeMessage entity 40720 is of message data type InventoryChangeMessage 40722.

The InventoryChangeMessage package 40718 includes an InventoryChange package 40724 that has an InventoryChange entity 40726. There is one 40728 InventoryChange entity 40726, which is of global data type ("GDT"): InventoryChange. As shown in FIG. 407A, each InventoryChange entity 40726 includes an ID 40732 and a BusinessTransactionTypeCode 40738. The ID 40732 is of type GDT: BusinessTransactionDocumentID 40736. The BusinessTransactionTypeCode 40738 is of type GDT: BusinessTransactionTypeCode 40742. For each InventoryChange entity 40726, there is one 40734 ID 40726 and one 40740 BusinessTransactionTypecode 40738.

The InventoryChange package 40724 also includes an Item package 40744. Item package 40744 includes an Item entity 40746 of type GDT: InventoryChangeItem 40750. There is one or more 40748 Item entity 40746. Each Item entity 40746 includes an ID 40752, a DateTime 40758, and a Note 40764. The ID 40752 is of type GDT: BusinessTransactionDocumentItemID 40756. The DateTime 40758 is of type GDT: DateTime 40762. The Note 40764 is of type GDT: Note 40768. For each Item entity 40746, there is one 40754 ID 40752, one 40760 DateTime 40758, and zero or one 40766 Note 40764.

The Item package 40744 also includes an Outbound package 40770, an Inbound package 40774, and a BusinessTransactionDocumentReference package 40776.

Outbound package 40770 includes an Outbound entity 40776 of type GDT: InventoryChangeItemOutbound 40780. There is zero or one Outbound entity 40776 for each InventoryChangeItem entity 40746. Outbound entity 40776 includes one or more 40784 Location entity 40782 of data type GDT: BTDLocation 40786. Location entity 40782 includes one 40790 InternalID entity 40788 of data type GDT: LocationInternalID 40792. Outbound entity also includes one 40796 Product entity 40794 of data type GDT: BTDProduct 40798. Product entity 40794 includes one 40702A InternalID 40700A of data type GDT: ProductInternalID 40704A. Outbound entity 40776 also includes one 40708A OwnerParty entity 40706A of data type GDT: BTDParty 40710A. OwnerParty entity 40706A includes one 40714A InternalID entity 40712A of data type GDT: PartyInternalID 40716A.

Outbound entity 40776 also includes an InventoryUsabilityStatusCode entity 40718A of data type GDT: InventoryUsabilityStatusCode 40722A, an OrderingQuantity entity 40724A of data type GDT: Quantity 40728A, a ValuationQuantity entity 40730A of data type GDT: Quantity 40734A, and an AdditionalQuantity 40736A of data type GDT: Quantity 40740A. For each Outbound entity 40776, there is one 40720A InventoryUsabilityStatusCode 40718A, zero or one 40726A OrderingQuantity 40724A, zero or one 40732A ValuationQuantity 40730A, and zero or more 40738A AdditionalQuantity 40736A.

Inbound package 40774 includes an Inbound entity 40742A of type GDT: InventoryChangeItemInbound 40746A. There is zero or one Inbound entity 40742A for each InventoryChangeItem entity 40746. Inbound entity 40742A includes one or more 40750A Location entity 40748A of data type GDT: BTDLocation 40752A. Location entity 40748A includes one 40756A InternalID entity 40754A of data type GDT: LocationInternalID 40758A. Inbound entity 40742A also includes one 40762A Product entity 40760A of data type GDT: BTDProduct 40764A. Product entity 40760A includes one 40768A InternalID 40766A of data type GDT: ProductInternalID 40770A. Inbound entity 40742A also includes one 40774A OwnerParty entity 40772A of data type GDT: BTDParty 40776A. OwnerParty entity 40772A includes one 40780A InternalID entity 40778A of data type GDT: PartyInternalID 40782A.

Inbound entity 40742A also includes an InventoryUsabilityStatusCode entity 40784A of data type GDT: InventoryUsabilityStatusCode 40788A, an OrderingQuantity entity 40790A of data type GDT: Quantity 40794A, a ValuationQuantity entity 40796A of data type GDT: Quantity 40700B, and an AdditionalQuantity 40702B of data type GDT: Quantity 40706B. For each Inbound 40742A, there is one 40786A InventoryUsabilityStatusCode 40784A, zero or one 40792A OrderingQuantity 40790A, zero or one 40798A Valuation-Quantity 40796A, and zero or more 40704B AdditionalQuantity 40702B.

BusinessTransactionDocumentReference 40776 includes a SalesOrderReference entity 40708B of type GDT: BusinessTransactionDocumentReference 40712B and a PurchaseOrderReference entity 40714B of type GDT: BusinessTransactionDocumentReference 40718B. For each InventoryChangeItem 40746, there is zero or one 40710B SalesOrderReference 40708B and zero or one 40716B PurchaseOrderReference 40714B.

p) Sales Order Fulfillment Interfaces

SalesOrderFulfillment interfaces allow sales orders and availability confirmations to be exchanged in a sales order fulfillment between a selling component or business entity and a procurement planning component or business entity (e.g., fulfillment coordination, supply chain execution, logistics, availability check, requirements planning, scheduling, procurement, and other business entities). As discussed in detail below, the SalesOrderFulfillment interfaces reflect the logistical part of the PurchaseOrder messages that are sent from the customer (Buyer) to the selling component (Seller).

In the 'Sell from Stock' scenario, goods and service orders are accepted by customers and create a request to logistics to fulfill the order. In this scenario, the order is fulfilled in that the ordered goods are procured to the customer from a warehouse. An availability check and scheduling (synchronously or asynchronously) is typically not planned for in the first step. Third-party order processing is not investigated in detail. It is assumed that there will be typically one procurement planning component (fulfillment coordination) that communicates with a selling component. If there are several procurement planning components, one of them is responsible for the communication with the selling components. There may be any number of selling components.

(1) Message Types (a) Sales Order Fulfillment Request

A SalesOrderFulfillmentRequest message is a request (or change and cancellation of such a request) from a selling component to a procurement planning component to fulfill a sales order and, in doing so, to take into account the logistical requirements (availability check, scheduling, requirements planning, procurement, delivery, . . . ) of a sales order. The structure of the message type SalesOrderFulfillmentRequest is specified by the message data type SalesOrderFulfillmentMessage in FIG. 409.

(b) Sales Order Fulfillment Confirmation

A SalesOrderFulfillmentConfirmation message is the confirmation, the partial confirmation, or the changing of the procurement planning component to the selling component with regards to the fulfillment of a sales order. The structure of the message type SalesOrderFulfillmentConfirmation is specified by the message data type SalesOrderFulfillmentMessage in FIG. 409.

The SalesOrderFulfillmentConfirmation message can be used by the procurement planning component in the following ways:

(1) The procurement planning component may inform the selling component of the confirmation status of the SalesOrderFulfillment. The confirmation status values may be 'accepted,' 'pending,' or 'rejected.' The confirmation status may be set at the header or item level of the SalesOrderFulfillmentConfirmation message as discussed in further detail below. In one implementation, a rejection at the header level equates to a rejection of all items. Acceptance at header level means acceptance of the SalesOrderFulfillment. Individual items may be accepted, opened, or rejected.

(2) The procurement planning component may explicitly confirm planned procurement schedules, quantities and other procurement elements to the selling component, and suggest substitute products.

The selling component may explicitly request a SalesOrderFulfillmentConfirmation by setting the FollowUpSalesOrderFulfillmentConfirmation/RequirementCode to 'expected.' In this implementation, the procurement planning component may send a SalesOrderFulfillmentConfirmation:

(1) as a response when a SalesOrderFulfillmentRequest message is received. In order to send the response as promptly as possible, no user interaction should be required with the procurement planning component. If it is not possible to accept or reject a request for the selling component automatically, the confirmation status 'pending' may be used.

(2) when the confirmation status of the SalesOrderFulfillment as a whole or of an item changes.

(3) when quantities or deadlines can be explicitly confirmed, or when changes to confirmations that have already been transferred occur.

A SalesOrderFulfillmentConfirmation may be sent by the procurement planning component when the procurement planning component rejects individual items or the SalesOrderFulfillment as a whole and when the procurement planning component requires changes to the sales order.

(2) Message Choreography

The interaction that takes place between the SalesOrderFulfillment interfaces is described in detail in the following section.

SalesOrderFulfillmentRequest and SalesOrderFulfillmentConfirmation are the messages that are used to represent a SalesOrderFulfillment process.

Furthermore, the selling component is interested in the actual confirmations from the procuring component: e.g., delivery created, reserved goods issued, goods packed and goods issue posted, DeliveryInfo.

(a) Process Flow

As depicted in FIG. 408, the message choreography may involve the following business entities or components: a Purchasing component 40802, a Sales component 40804, a Fulfillment coordination component 40806, a SupplyChain Planning component 40808, and a SupplyChain Execution component 40810. To start the process, the Sales component 40804 receives a PurchaseOrderRequest message 40812 from the Purchasing component 40802. In response, the Sales component 40804 starts a fulfillment process for a sales order by sending a SalesOrderFulfillmentRequest message 40814 to the Fulfillment Coordination component 40806, which in turn sends the SalesOrderFulfillmentRequest message 40814 to the SupplyChain Planning component 40816. Supply Chain Planning 40816 may respond to FulFillment Coordination 40806 with a SalesOrderFulfillmentConfirmation 40818.

After the process has started, the Sales component 40804, whether internally or triggered by the customer, is operatively configured to communicate requests for changes via a SalesOrderFulfillmentRequest message (e.g., that has an action code set to 'Change') to Fulfillment Coordination 40806. The Sales component 40804 is also operatively configured to communicate a request to delete or reject the sales order (e.g., action code set to 'Delete'). After the SalesOrderFulfillmentRequest message has been received, the procurement planning component (Fullfillment Coordination 40806 ) may inform the selling component (Sales component 40804 ) about the status of the sales order with regard to the confirmed quantities and dates via a SalesOrderFulfillmentConfirmation message 40820. Upon receiving this, the Sales component 40804 may send a PurchaseOrderConfirmation 40822 to the Purchasing component 40802.

(b) Serialization of Messages

The messages within a SalesOrderFulfillment process are transferred EOIO (exactly once in order) and serialized using message queues. In one implementation, there is one message queue per SalesOrderFulfillment process (as opposed to one queue for all SalesOrderFulfillment messages) so that if one message fails, not all other SalesOrderFulfillment messages are blocked throughout the entire system.

(c) Error Handling

A target system (e.g., the Fulfillment Coordination component) is operatively configured to accept each formally correct incoming SalesOrderFulfillment message. Business problems are solved via a SalesOrderFulfillmentRequest (change, reject) message on the selling side and via a SalesOrderFulfillmentConfirmation message on the procurement planning side. In order to avoid endless message loops, a selling system may not be allowed to reject a SalesOrderFulfillmentConfirmation automatically via a SalesOrderFulfillmentRequest, or it has to present other mechanisms to avoid endless loops (for example, maximum one consecutive rejection permitted). To restart a SalesOrderFulfillment process that is corrupt due to a failed message, the selling system should offer the possibility of transferring the current state of the SalesOrderFulfillment with a SalesOrderFulfillmentRequest message. The action codes 'Save' and 'Remove' can be used in this message. The procurement planning system should offer the same functionality for the SalesOrderFulfillmentConfirmation. In order to be able to restart a process after a failed SalesOrderFulfillmentRequest message (create), the selling system should be in a position to start a SalesOrderFulfillment process with a SalesOrderFulfillmentRequest message (change).

(3) Message Data Type Sales Order Fulfillment Message

Figure 409A:
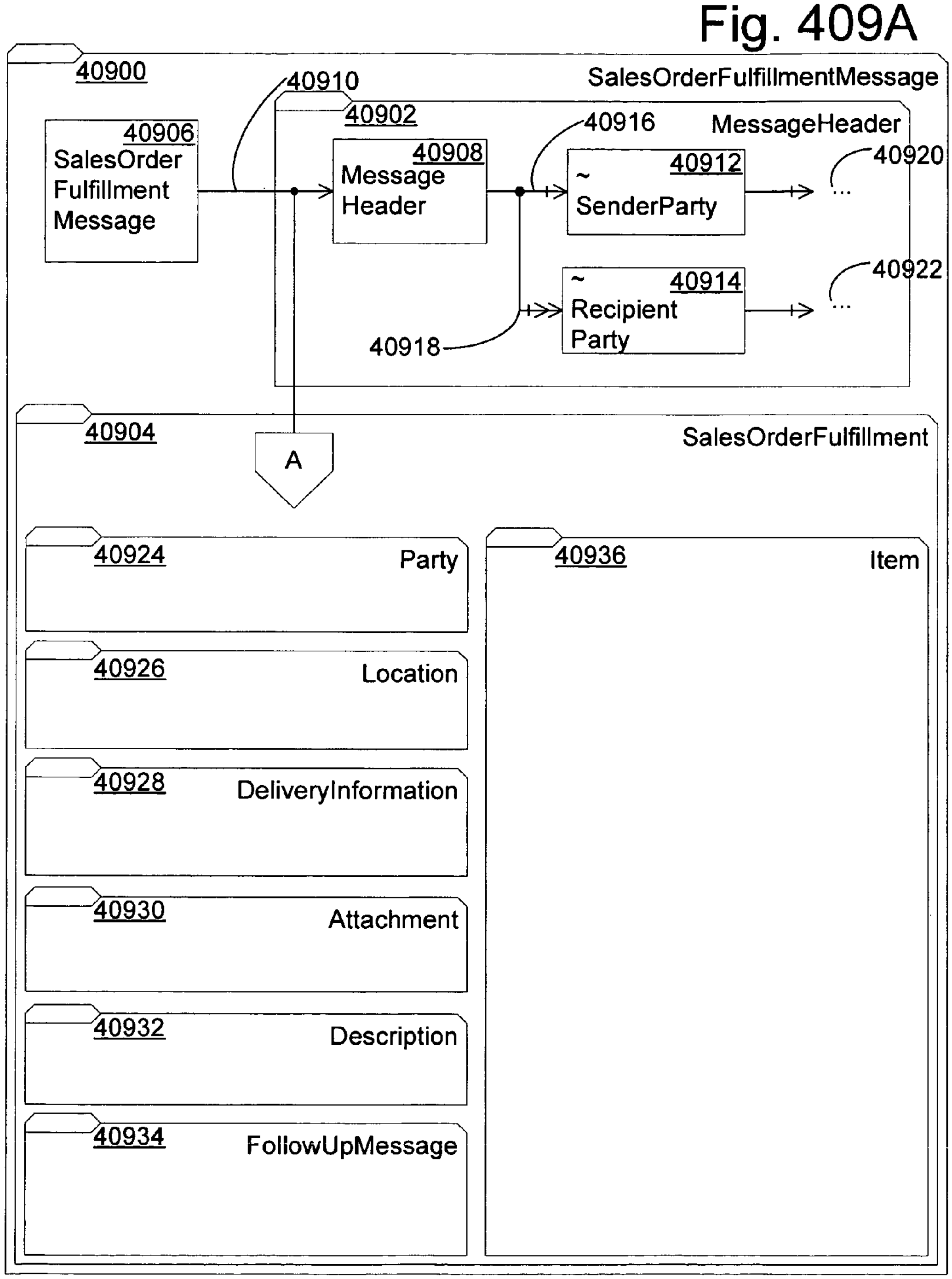

The data model for the message data type SalesOrderFulfillmentMessage used to implement a SalesOrderFulfillmentRequest message, a SalesOrderFulfillmentConfirmation message, and relevant interfaces is depicted in FIGS. 409A-L. The message data type SalesOrderFulfillmentMessage includes the object SalesOrderFulfillment included in the business document and the business information that is relevant for sending a business document in a message. As shown in FIG. 409A, the SalesOrderFulfillmentMessage 40900 includes a MessageHeader package 40902, a SalesOrderFulfillment package 40904, and a SalesOrderFulfillmentMessage object or entity 40906.

(a) Message Header package

The MessageHeader package 40902 groups the business information that is relevant for sending a business document in a message. The MessageHeader package 40902 includes a MessageHeader entity 40908. There is a 1:1 relationship 40910 between the SalesOrderFulfillmentMessage entity 40906 and the MessageHeader entity 40908. The MessageHeader package 40902 also includes a SenderParty entity 40912 and a RecipientParty entity 40914. The MessageHeader entity 40908 has a 1:c relationship 40916 with the SenderParty entity 40912 and a 1:cn relationship 40918 with the RecipientParty entity 40914.

(i) Message Header

The MessageHeader entity 40908 groups the business information for the sending application for identifying the business document in a message, information about the sender, and potential information about the recipient. The MessageHeader entity 40908 is of type GDT: BusinessDocumentMessageHeader.

(ii) Sender Party

The SenderParty entity 40912 is responsible for sending a business document at business application level. The SenderParty entity 40912 is of type GDT:BusinessDocumentMessageHeaderParty.

(iii) Recipient Party

The RecipientParty 40914 is responsible for receiving a business document at business application level. The RecipientParty 40914 is of type GDT: BusinessDocumentMessageHeaderParty.

(b) Sales Order Fulfillment Package

Figure 409B:
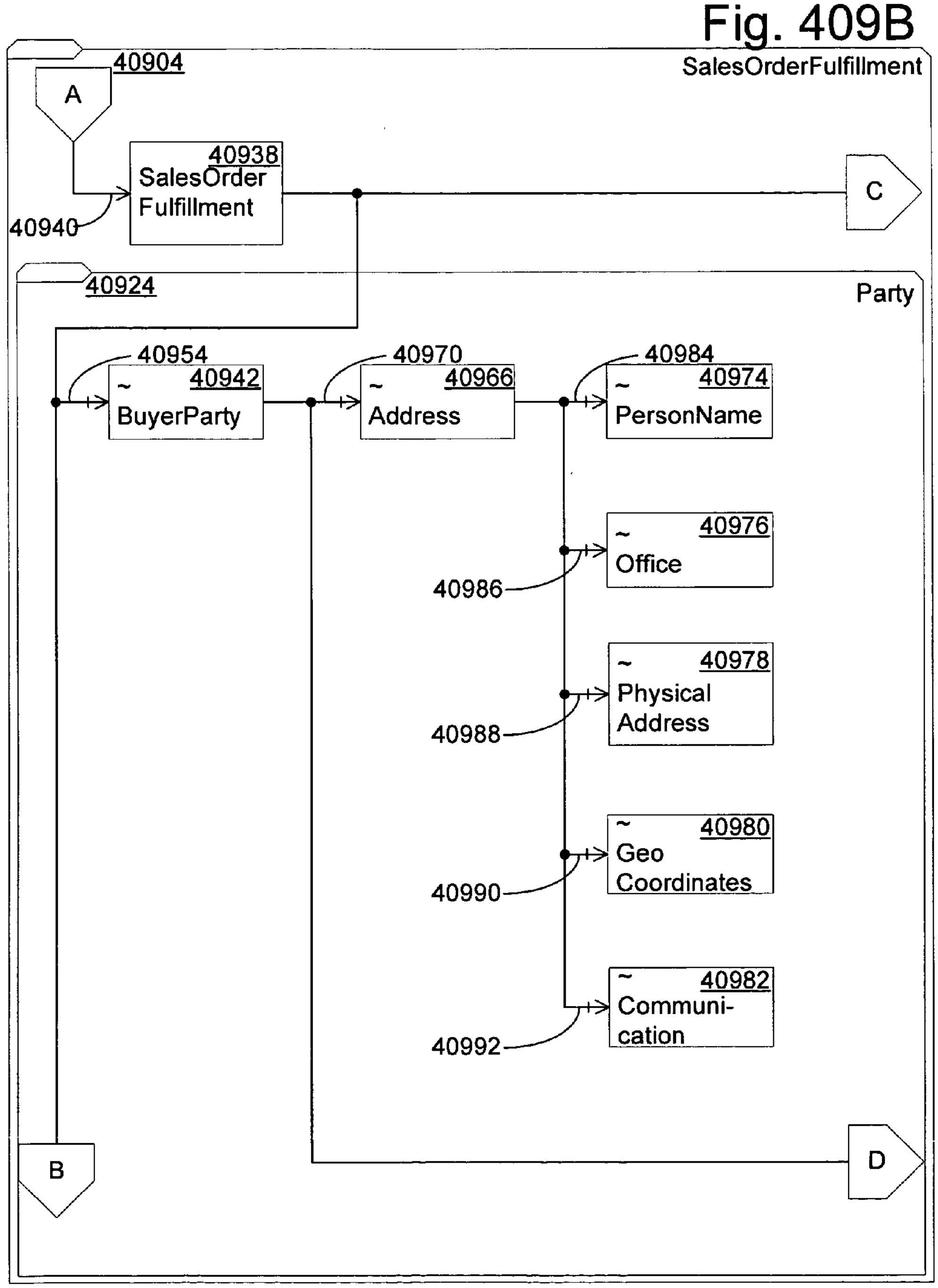
Figure 409C:
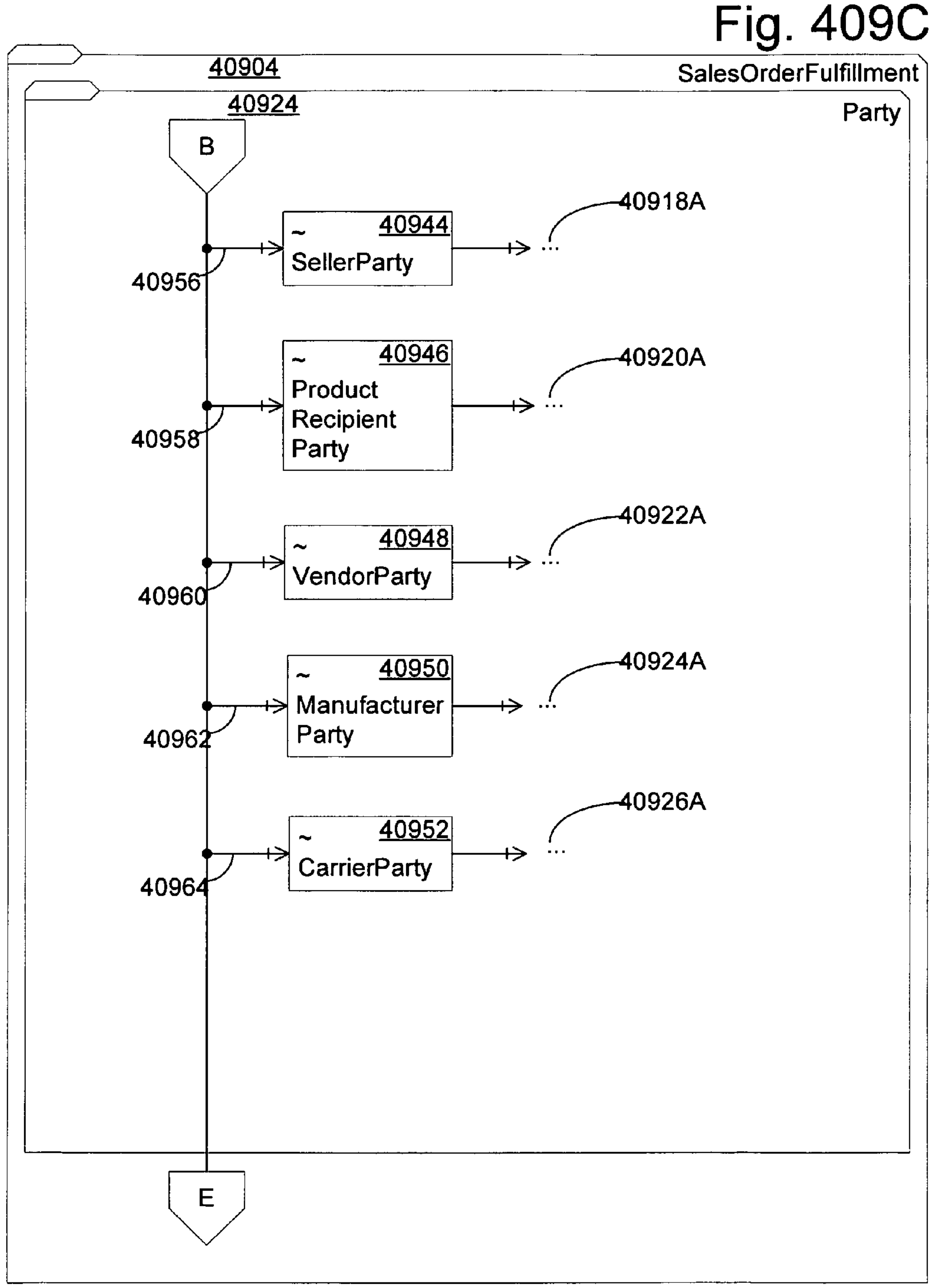
Figure 409D:
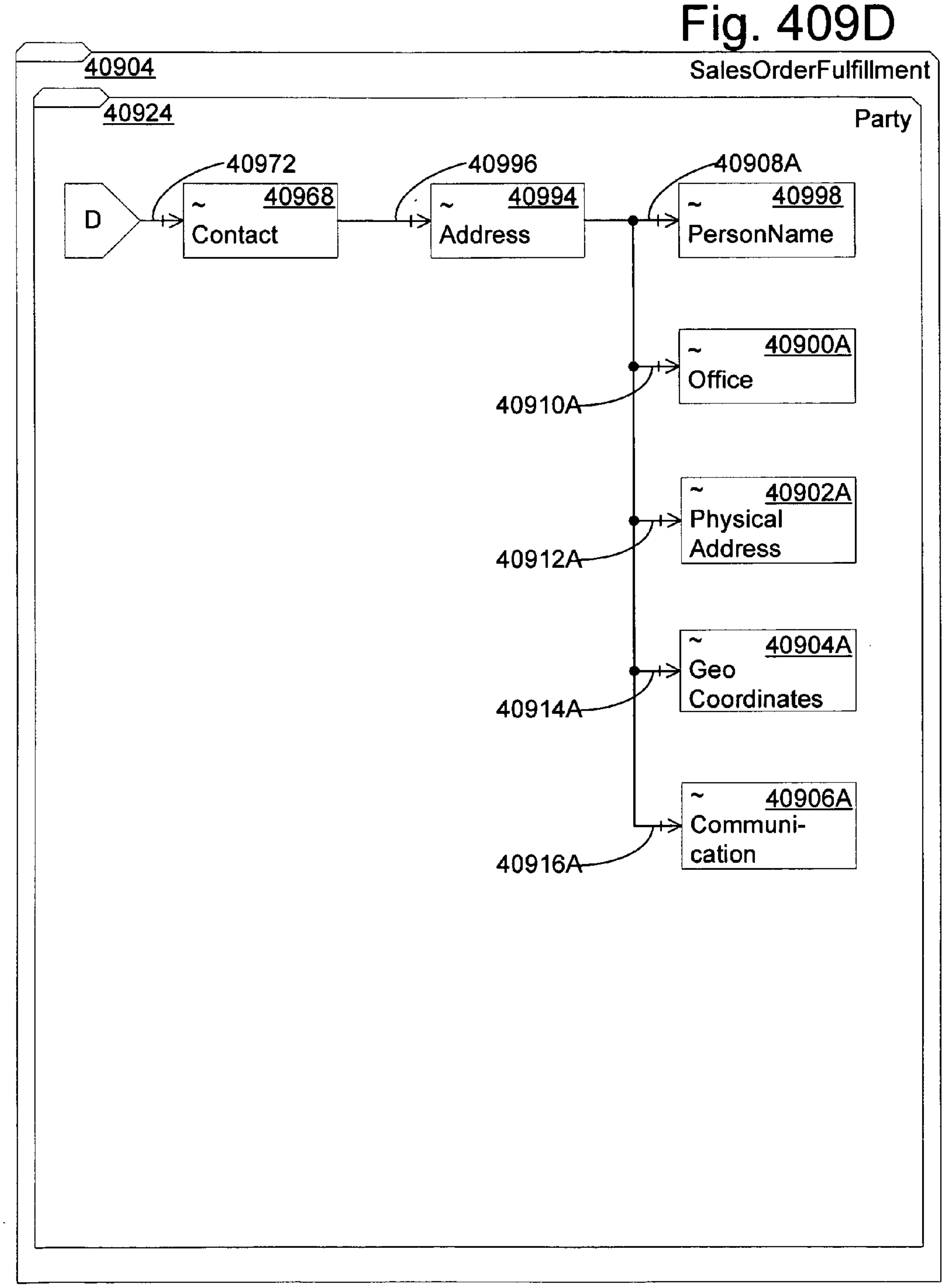

The SalesOrderFulfillment package 40904 groups the SalesOrderFulfillment with a Party Package 40924, a Location Package 40926, a DeliveryInformation Package 40928, an Attachment Package 40930, a Description Package 40932, a FollowUpBusinessTransactionDocument Package 40934, an Item Package 40936, and a SalesOrderFulfillment entity 40938 (FIG. 409B). There is a 1:1 relationship 40940 between the SalesOrderFulfillmentMessage entity 40906 and the SalesOrderFulfillment entity 40938.

(i) Sales Order Fulfillment

A SalesOrderFulfillmentRequest is a request (or change and cancellation of such a request) to fulfill a sales order and, in doing so, to take into account the logistical requirements (availability check, scheduling, requirements planning, procurement, delivery, . . . ) of a sales order. The SalesOrderFulfillment entity 40938 (FIG. 409B) is divided into SalesOrderFulfillmentItems 40932B (FIG. 409H) that each specify the product that is still to be fulfilled or additional information for such a product such as BOM information (see PurchaseOrderItem Package). The SalesOrderFulfillment entity 40938 has a 1:cn relationship 40934B with the Item entity 40932B. Alongside the purchasing party and the seller, other parties can be involved in the SalesOrderFulfillment (see Party Package 40924). For the fulfillment of the SalesOrderFulfillment, locations can be determined (see Location Package 40926), and delivery methods can be agreed upon (see DeliveryInformation Package 40928). Notes or references to attachments can be added to the SalesOrderFulfillment (see Description Package 40932 or Attachment Package 40930). Furthermore, it is possible to specify which types of follow-up documents are expected with regard to the SalesOrderFulfillment (see FollowUpBusinessTransactionDocument Package 40934). The SalesOrderFulfillment entity 40938 is of type GDT: SalesOrderFulfillment.

The SalesOrderFulfillment entity 40938 includes an ID, a BaseBusinessTransactionDocumentID, a BaseBusinessTransactionDocumentTypeCode, an ActionCode, an ItemListCompleteTransmissionIndicator, a CreationDateTime, a LastChangeDateTime, and an AcceptanceStatusCode. The ID is a unique identification issued by the seller for a SalesOrderFulfillment. The ID is of type GDT: BusinessTransactionDocumentID. The BaseBusinessTransactionDocumentID is a unique identifier of the business document underlying the SalesOrderFulfillment. The BaseBusinessTransactionDocumentID is of type GDT: BusinessTransactionDocumentID. The BaseBusinessTransactionDocumentTypeCode is the coded representation of the type of the business document underlying the SalesOrderFulfillment. The BaseBusinessTransactionDocumentTypeCode is of type GDT: BusinessTransactionDocumentTypeCode. The ActionCode is the request to newly create, change, or delete the SalesOrderFulfillment at the recipient of the SalesOrderFulfillment. The ActionCode is of type GDT Action- Code. The ItemListCompleteTransmissionIndicator specifies whether all items of the requesting document are always transferred and non-transferred items implicitly count as rejected, or whether only new and changed items as well as items that have been rejected since the last transfer are transferred. The ItemListCompleteTransmissionIndicator is of type GDT CompleteTransmissionIndicator. The CreationDateTime is the creation date of the requesting document. CreationDateTime is of type GDT Date Time. The LastChangeDateTime is the change date of the requesting document. The LastChangeDateTime is of type GDT Date Time. The AcceptanceStatusCode is the coded representation of the status of the agreement of the procurement planning unit. The AcceptanceStatusCode is of type GDT: AcceptanceStatusCode.

ActionCode/CompleteTransmissionIndicator: in a SalesOrderFulfillmentRequest, items and schedule lines may be transferred with complete dates at the object level, that is to say, when an item or a schedule line is transferred, all dates of that item or schedule line specified on the interface may be transferred too. In the SalesOrderFulfillmentRequest, the ActionCode may be used at a header and an item level to display whether the SalesOrderFulfillmentRequest or individual items are to be created, changed or deleted or rejected (for example, individual schedule lines). A SalesOrderFulfillmentRequest may be configured to control whether all items are transferred or only those items that have been explicitly changed via the CompleteTransmissionIndicator. One convention is that if the CompleteTransmissionIndicator is set, the ActionCode is by definition set to 'Create.' In this case, items that have not been transferred are implicitly deleted.

The AcceptanceStatusCode may be used in the SalesOrderFulfillmentConfirmation message at header and item level to describe the status of the agreement of the procurement planning component with regard to the SalesOrderFulfillment or individual items.

(ii) Sales Order Fulfillment Party Package

The Party package 40924 (FIG. 409B) is a grouping of the business parties involved in the SalesOrderFulfillment. The Party package 40924 includes a BuyerParty entity 40942, a SellerParty entity 40944 (FIG. 409C), a ProductRecipientParty entity 40946, a VendorParty entity 40948, a ManufacturerParty entity 40950, and a CarrierParty entity 40952. The SalesOrderFulfillment entity 40938 has a respective 1:c relationship 40954-64 with each of the BuyerParty entity 40942, the SellerParty entity 40944, the ProductRecipientParty entity 40946, the VendorParty entity 40948, the ManufacturerParty entity 40950, and the CarrierParty entity 40952.

(a) Buyer Party

The BuyerParty is a party that buys goods or services. The BuyerParty entity 40942 is of type GDT: BusinessTransactionDocumentParty. In one implementation, the BuyerParty entity 40942 uses an InternalID from the GDT: BusinessTransactionDocumentParty data type to identify the BuyerParty. In one implementation, the same BuyerParty applies to all items in a SalesOrderFulfillment. In SAP CRM, the BuyerParty is also referred to as the SoldToParty or the customer.

The BuyerParty entity 40942 has a 1:c relationship 40970 with an Address entity 40966 and a 1:c relationship 40972 with a Contact entity 40968. The Address entity 40966 has a respective 1:c relationship 40984-92 with each of a PersonName entity 40974, a Office entity 40976, a PhysicalAddress entity 40978, a GeoCoordinates entity 40980, and a Communication entity 40982. Likewise, Contact entity 40968 has a respective 1:c relationship 40996 with an Address entity 40994, which in turn has a respective 1:c relationship 40908A-16A with each of a PersonName entity 40998, an Office entity 40900A, a Physical Address entity 40902A, a GeoCoordinates entity 40904A, and a Communication entity 40906A.

(b) Seller Party

A SellerParty is a party that sells goods or services. The SellerParty entity 40944 is of type GDT: BusinessTransactionDocumentParty. In one implementation, the SellerParty entity 40944 uses an InternalID from the GDT: BusinessTransactionDocumentParty data type to identify the SellerParty. In one implementation, the same SellerParty applies to all items in a SalesOrderFulfillment.

(c) Product Recipient Party

A ProductRecipientParty is a party to which goods are delivered or services are provided. The ProductRecipientParty entity 40946 is of type GDT: BusinessTransactionDocumentParty. In one implementation, the ProductRecipientParty entity 40946 uses an InternalID from the GDT: BusinessTransactionDocumentParty data type to identify the ProductRecipientParty. In one implementation, if a ShipToLocation is not explicitly specified in a SalesOrderFulfillment process, the address of the ProductRecipientParty may be used as the ShipToLocation address.

(d) Vendor Party

A VendorParty is a party which delivers goods or provides services. The VendorParty entity 40948 is of type GDT: BusinessTransactionDocumentParty. In one implementation, the VendorParty entity 40948 uses an InternalID from the GDT: BusinessTransactionDocumentParty data type to identify the VendorParty. In one implementation, if a ShipFromLocation is not explicitly specified in a SalesOrderFulfillment process, the address of the VendorParty may be used as the ShipFromLocation address. The VendorParty is not the company or the person that exclusively takes on the transport of goods. The CarrierParty is intended for this. The contact and the address of the VendorParty are used by the selling component as the contact person for the procurement planning component.

(e) Manufacturer Party

A ManufacturerParty is a party that manufactures goods. The ManufacturerParty entity 40950 is of type GDT: BusinessTransactionDocumentParty. In one implementation, the ManufacturerParty entity 40950 uses an InternalID from the GDT: BusinessTransactionDocumentParty data type to identify the ManufacturerParty.

(f) Carrier Party

A CarrierParty is a party that transports goods. The CarrierParty entity 40952 is of type GDT: BusinessTransactionDocumentParty. In one implementation, the CarrierParty entity 40952 uses an InternalID from the GDT: BusinessTransactionDocumentParty data type to identify the CarrierParty.

(iii) Sales Order Fulfillment Location Package

Figure 409E:
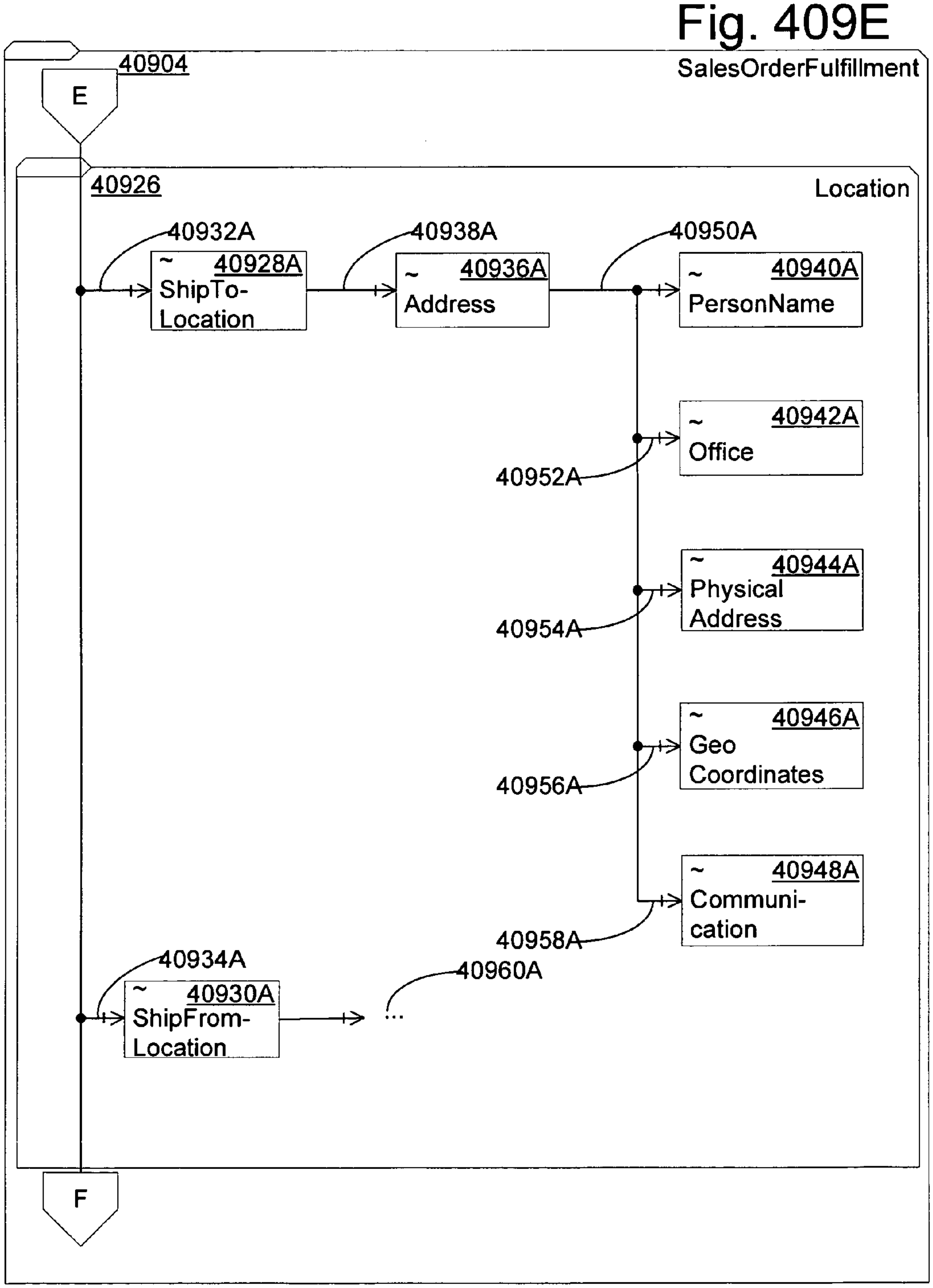
Figure 409F:
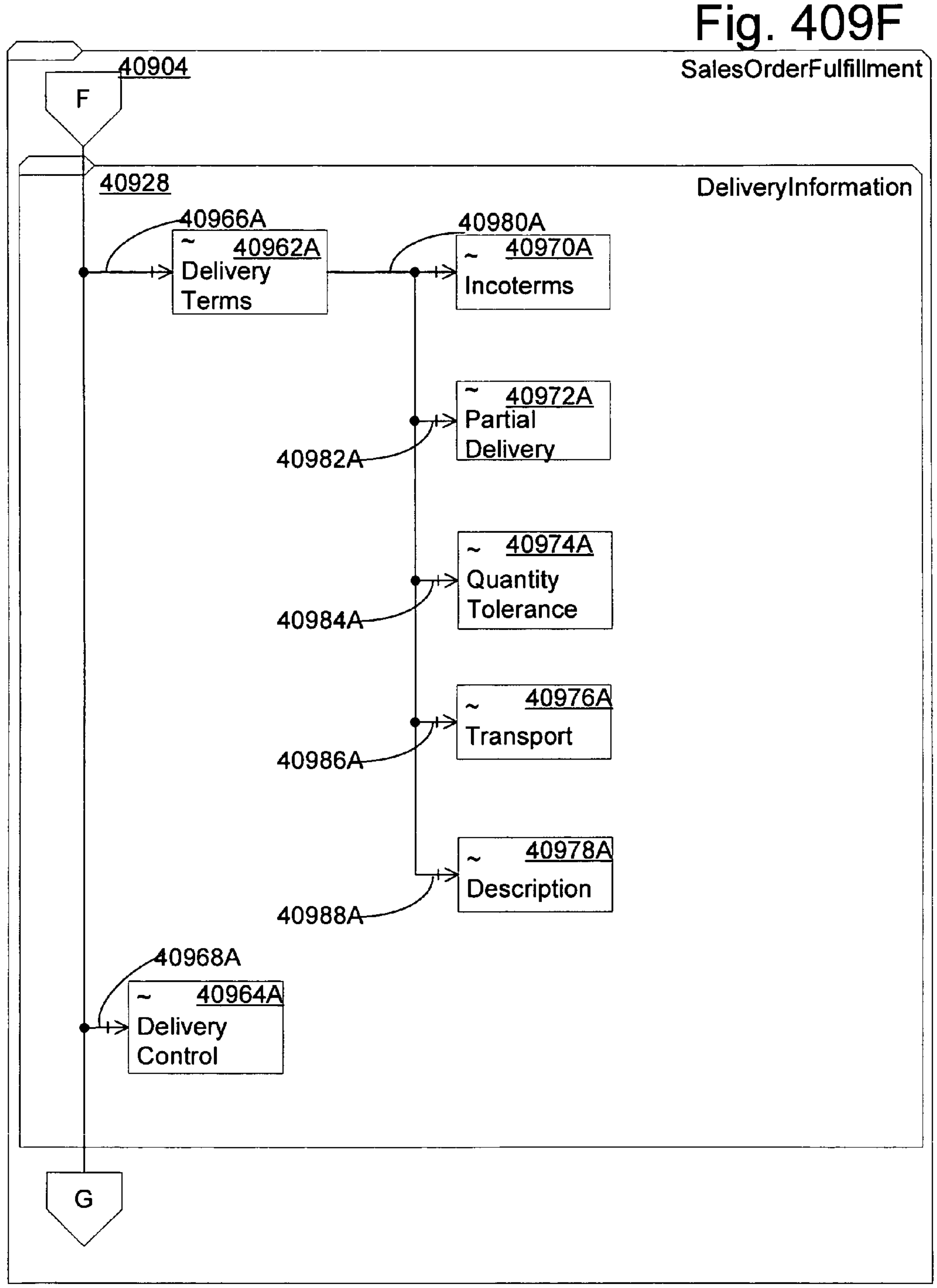
Figure 409G:
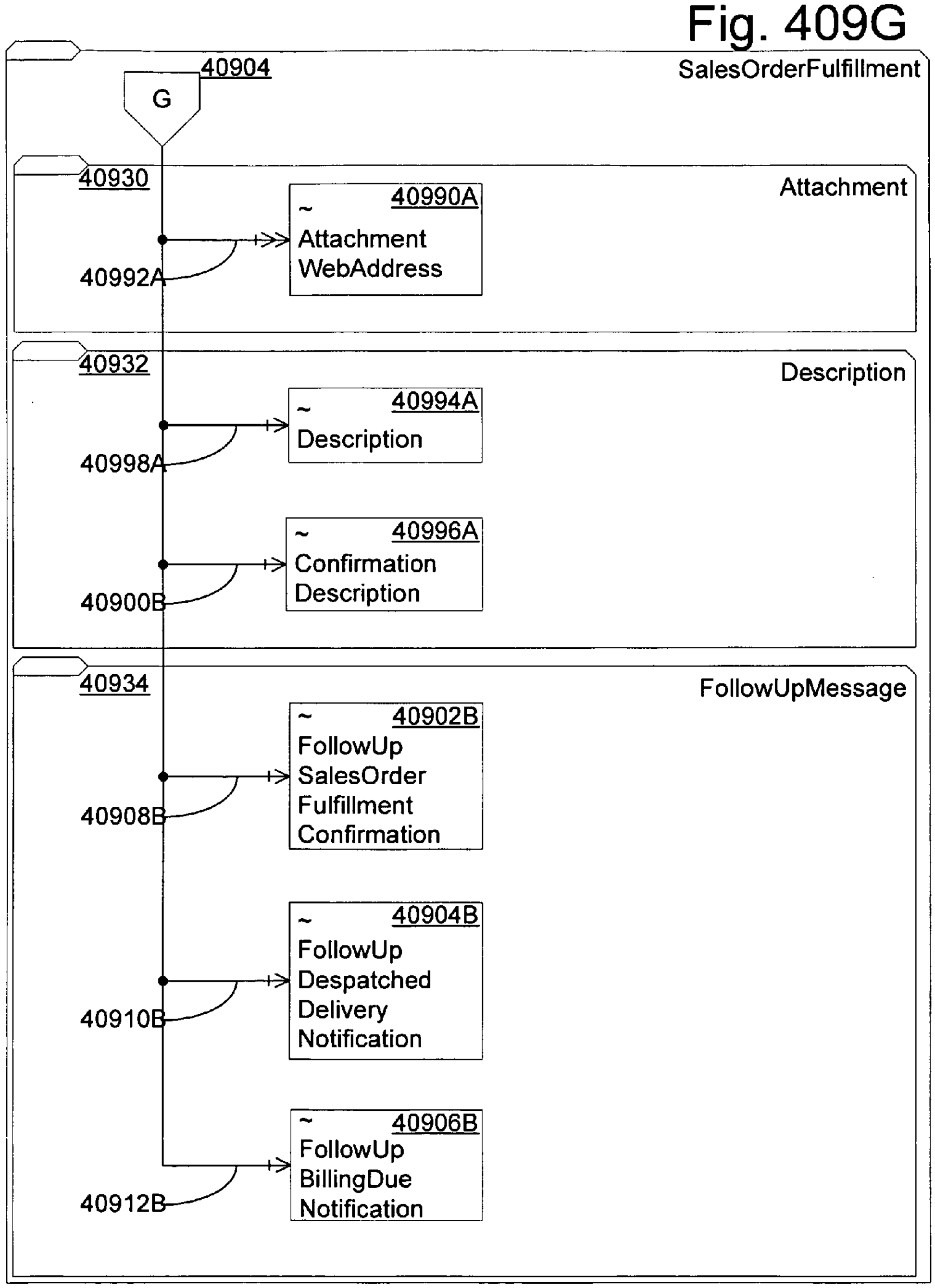
Figure 409H:
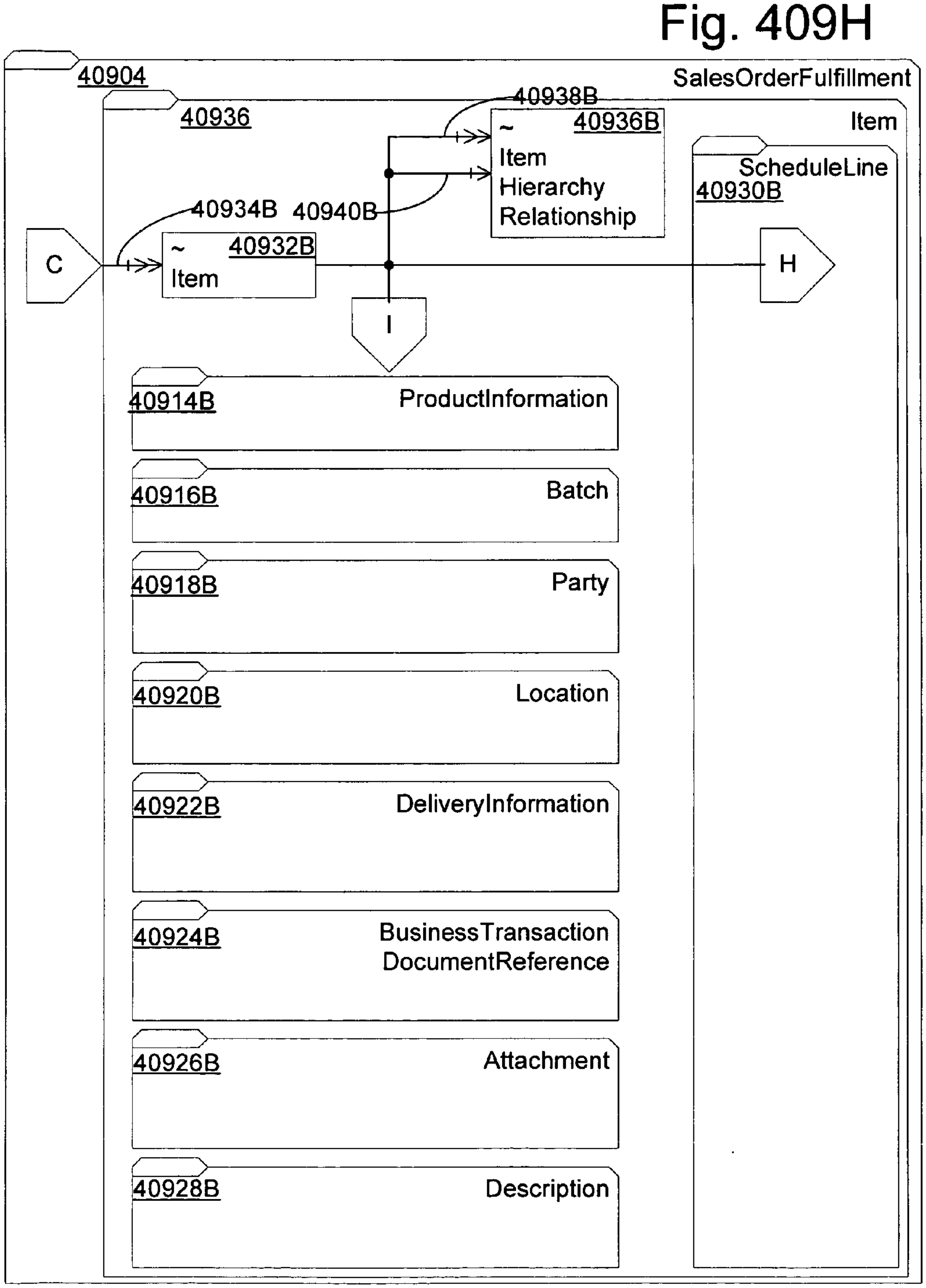
Figure 409I:
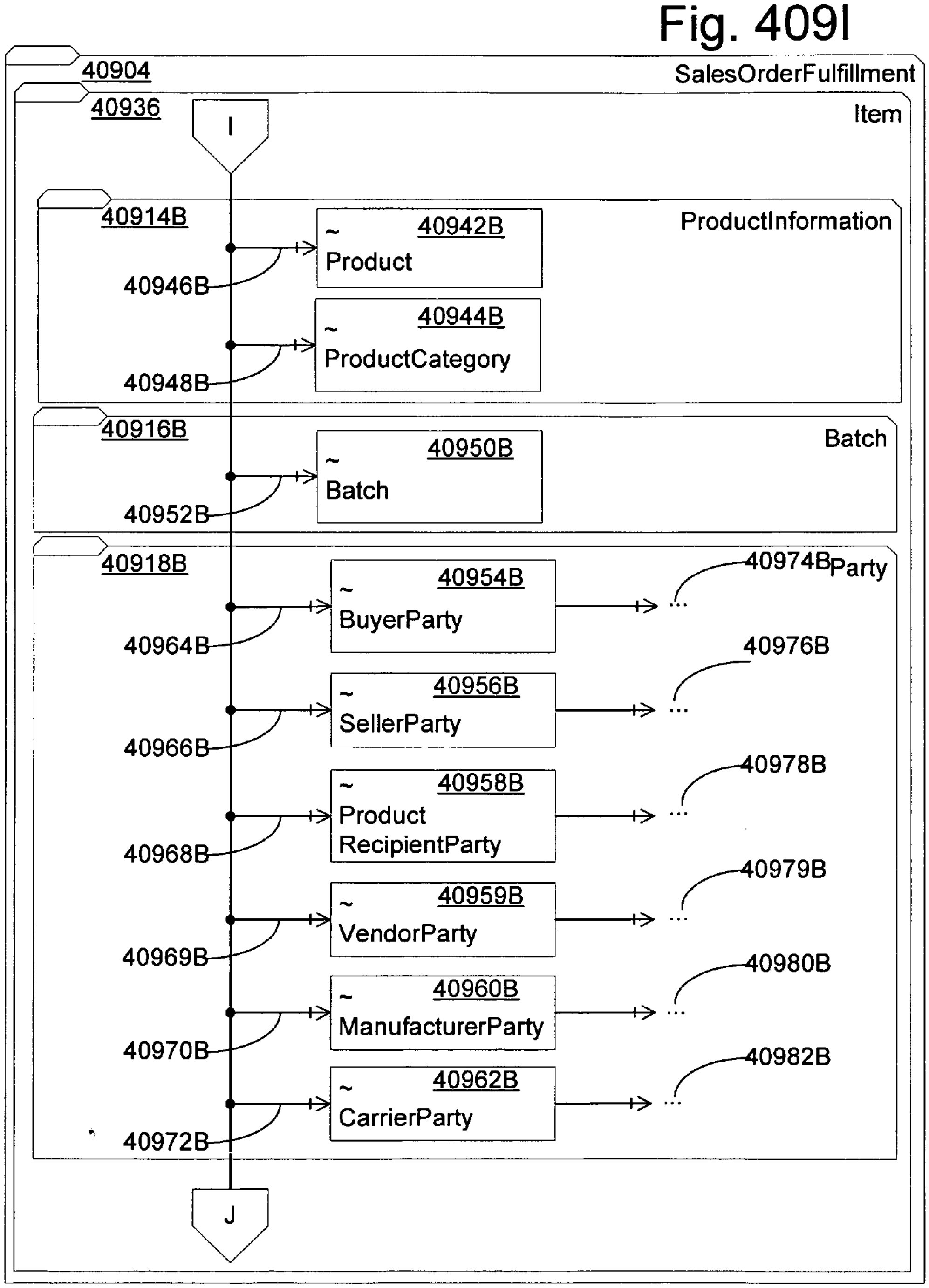
Figure 409J:
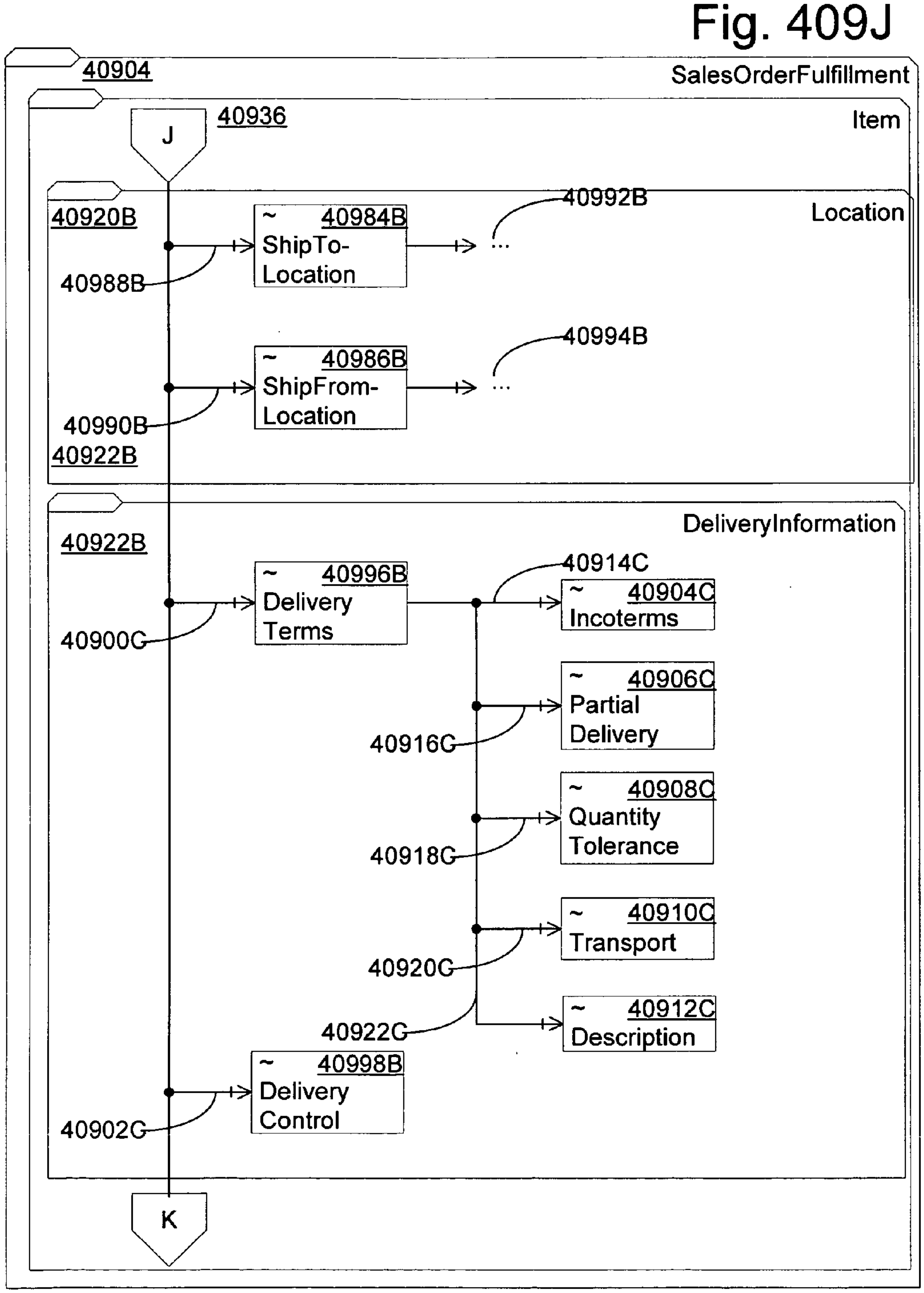
Figure 409K:
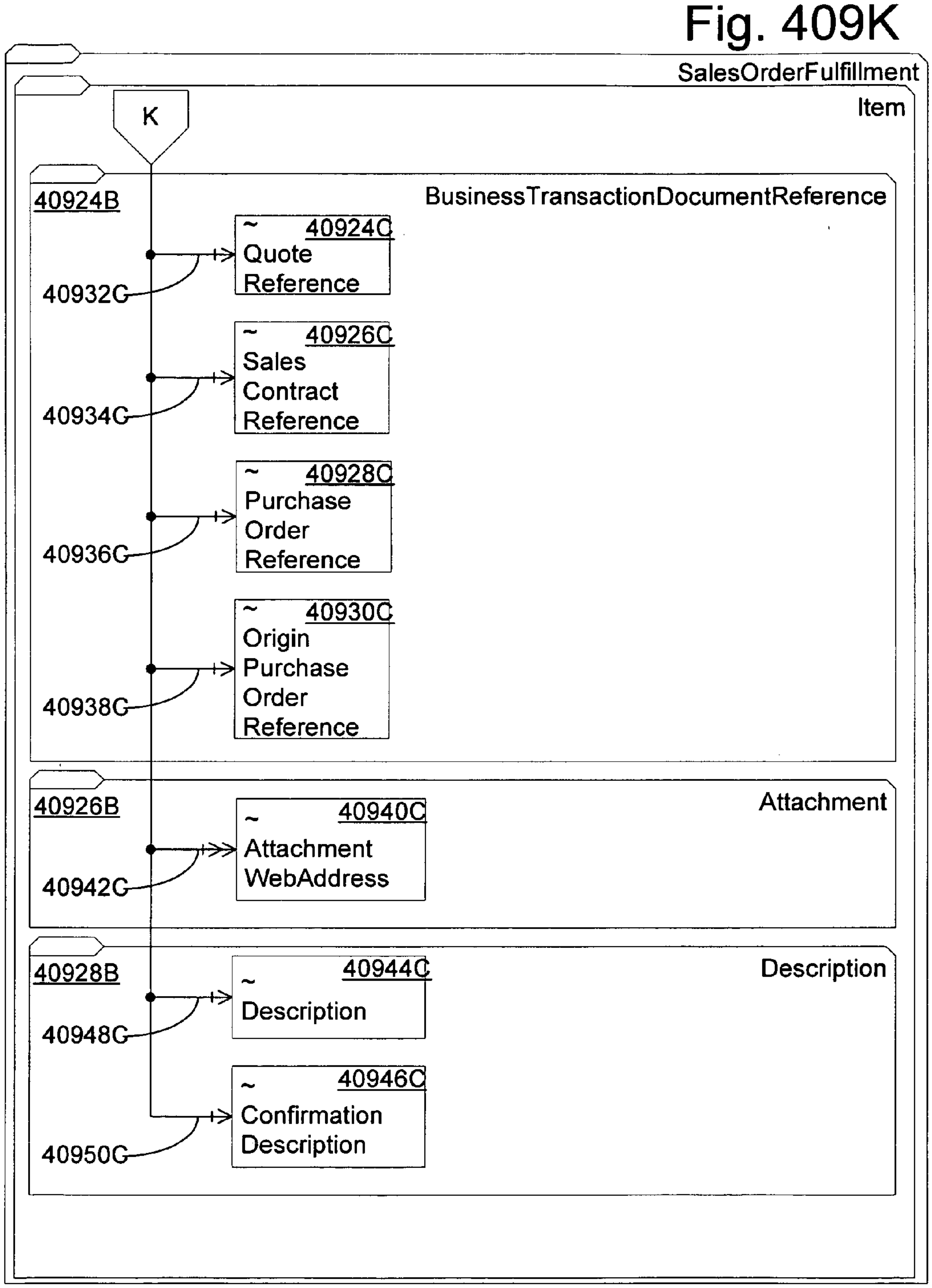
Figure 409L:
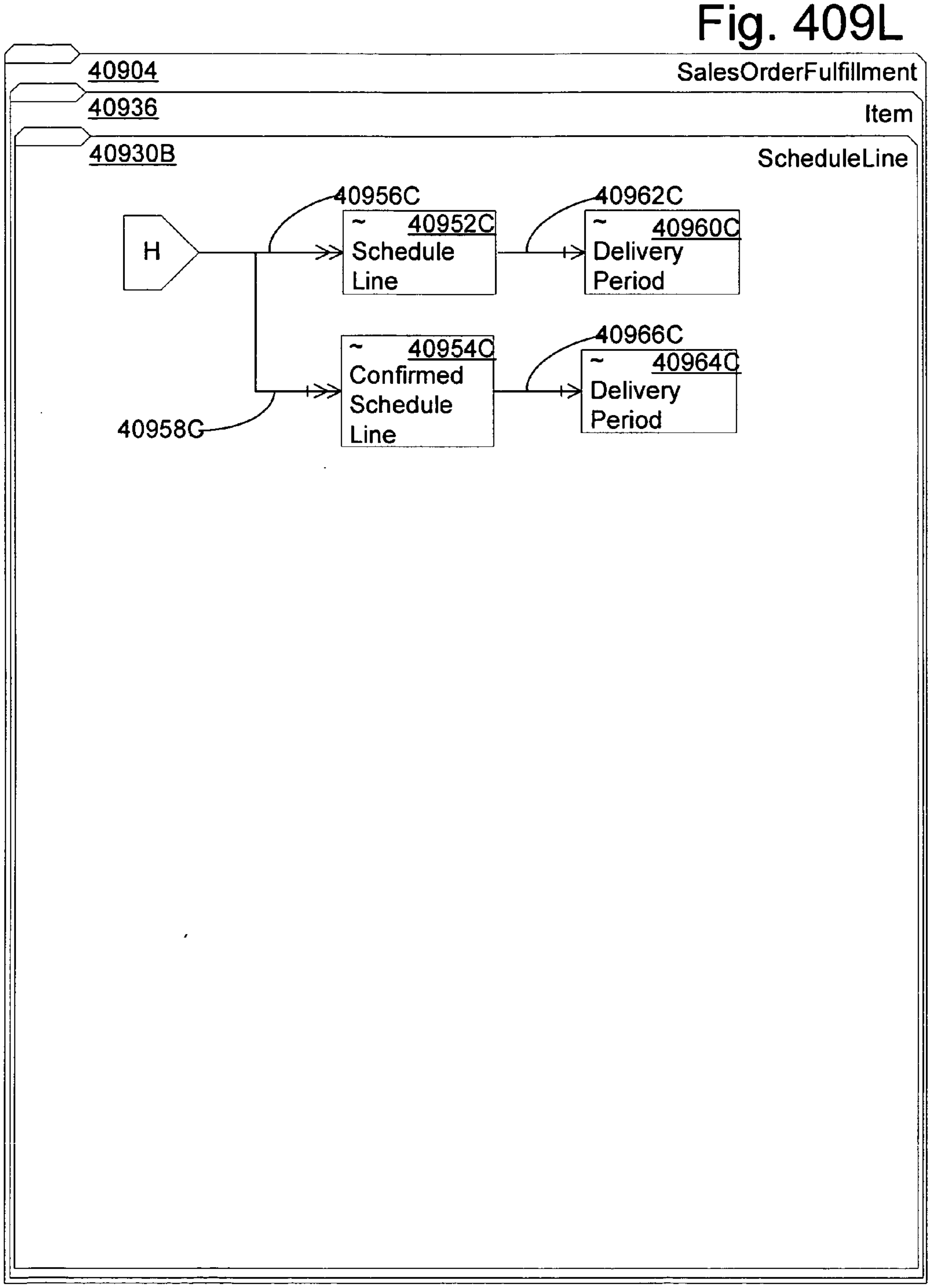

The location package 40926 groups all locations that are relevant for the SalesOrderFulfillment. As shown in FIG. 409E, the location package 40926 includes a ShipToLocation 40928A and a ShipFromLocation 40930A. The SalesOrderFulfillment entity 40938 has a respective 1:c relationship 40932A or 40934A with each of the ShipToLocation 40928A and the ShipFromLocation 40930A. Changes to locations may be changes to all items to which this location applies. For each location, an ID or the address or both may be transferred.

(a) Ship To Location

A ShipToLocation is the place to which goods should be delivered or where a service should be rendered. The ShipToLocation entity 40928A is of type GDT: BusinessTransactionDocumentParty. In one implementation, the ShipToLocation entity 40928A uses an InternalID from the GDT: BusinessTransactionDocumentParty data type to identify the ShipToLocation. In CRM, ShipToLocation may be understood to mean the unloading point at the ProductRecipientParty. The ShipToLocation entity 40928A has a 1:c relationship 40938A with an Address entity 40936A, which has a respective 1:c relationship 40950A-58A with each of a PersonName 40940A entity, a Office entity 40942A, a PhysicalAddress entity 40944A, a GeoCoordinates entity 40946A, and a Communication entity 40948A.

(b) Ship From Location

A ShipFromLocation is the place from which goods should be delivered. The ShipFromLocation entity 40934A is of type GDT: BusinessTransactionDocumentLocation. In one implementation, the ShipFromLocation entity 40934A uses an InternalID from the GDT: BusinessTransactionDocumentParty data type to identify the ShipFromLocation. In CRM, ShipFromLocation may be understood to mean the plant of the VendorParty. As indicated by elipsis 40960A, the ShipFromLocation entity 40930A is defined to include or have similar relationships with the same elements as those described for the ShipToLocation entity 40928A.

(iv) Sales Order Fulfillment Delivery Information Package

The DeliveryInformation package 40928 groups all information on a required procurement in a SalesOrderFulfillment process. The DeliveryInformation package 40928 includes a DeliveryTerms entity 40962A and a DeliveryControl entity 40964A. The SalesOrderFulfillment entity 40938 has a 1:c relationship 40966A with the DeliveryTerms entity 40962A and a 1:c relationship 40968A with the DeliveryControl entity 40964A.

(a) Delivery Terms

DeliveryTerms are the conditions and agreements that are valid for executing the delivery and transporting the ordered goods and for the necessary services and activities. The DeliveryTerms entity 40962A is of type GDT: DeliveryTerms and has a respective 1:c relationship 40980A-88A with each of an Incoterms entity 40970A, a Partial Delivery entity 40972A, a QuantityTolerance entity 40974A, a Transport entity 40976A, and a Description entity 40978A.

(b) Delivery Control

DeliveryControl is the quantity of controlling parameters for procurement in a SalesOrderFulfillment process. The DeliveryControl entity 40964A includes a DeliveryBlockedIndicator, which indicates whether the sales order or the sales order item are blocked for delivery. DeliveryBlockedIndicator is of type GDT:BusinessTransactionBlockedIndicator.

(v) Sales Order Fulfillment Attachment Package

The Attachment package 40930 groups attachment information with reference to the requesting order. The Attachment package 40930 includes an AttachmentWebAddress entity 40990A. The SalesOrderFulfillment entity 40938 has a 1:cn relationship 40992A with the AttachmentWebAddress entity 40990A. AttachmentWebAddress entity 40990A is a reference to an attachment. The AttachmentWebAddress entity 40990A is of type GDT:WebAddress.

(vi) Sales Order Fulfillment Description Package

The Description package 40932 groups all texts to be described with reference to the SalesOrderFulfillment. The Description package 40932 includes a Description entity 40994A and a ConfirmationDescription entity 40996A. The SalesOrderFulfillment entity 40938 has a 1:c relationship 40998A with the Description entity 40994A and a 1:c relationship 40900B with the ConfirmationDescription entity 40996A.

(a) Description

A Description is a text written in normal language that can be seen by parties with reference to the SalesOrderFulfillment. The Description entity 40994A is of type GDT:Description. The Description entity 40994A may be used for all types of textual information that relates to the transferred SalesOrderFulfillment and not only to the current message. An example would be a description of how the customer should be dealt with regarding the delivery.

(b) Confirmation Description

A ConfirmationDescription is a text written in normal language that can be seen by parties with reference to the SalesOrderFulfillmentConfirmation. The ConfirmationDescription entity 40996A is of type GDT: Description. The ConfirmationDescription entity 40996A may be used for all types of textual information that relates to the SalesOrderFulfillmentConfirmation. An example would be an explanation as to why a SalesOrderFulfillment was rejected.

(vii) Sales Order Fulfillment Follow-Up Message Package

The FollowUpMessage package 40934 groups information about follow up messages that the selling component expects from the procurement planning component with regard to the SalesOrderFulfillment. The FollowUpMessage package 40934 includes a FollowUpSalesOrderFulfillmentConfirmation entity 40902B, a FollowUpDespatchedDeliveryNotification entity 40904B, and a FollowUpBillingDueNotification entity 40906B. The SalesOrderFulfillment entity 40938 has a respective 1:c relationship 40908B-40912B with each of the FollowUpSalesOrderFulfillmentConfirmation entity 40902B, the FollowUpDespatchedDeliveryNotification entity 40904B, and the FollowUpBillingDueNotification entity 40906B.

(a) Follow-Up Sales Order Fulfillment Confirmation

A FollowUpSalesOrderFulfillmentConfirmation is a notice which shows whether the selling component expects a confirmation of the SalesOrderFulfillment from the procurement planning component. The FollowUpSalesOrderFulfillmentConfirmation entity 40902B includes a RequirementCode, which is a coded representation of the notice which shows whether the selling component expects a confirmation from the procurement planning component. The RequirementCode is of type GDT: FollowUpMessageCode. In one implementation, the RequirementCode of the FollowUpSalesOrderFulfillmentConfirmation entity 40902B has a value of 'expected' or 'unexpected.' In one implementation, the RequirementCode is set by the selling component.

(b) Follow-Up Despatched Delivery Notification

A FollowUpDespatchedDeliveryNotification is a notice that shows whether and, if so, how the customer would like to be informed about a delivery by the procurement planning component. The FollowUpDespatchedDeliveryNotification is passed on to the procurement planning component from the PurchaseOrderRequest. The FollowUpDespatchedDelivery Notification entity 40904B includes a RequirementCode, which is a coded representation of the notice that shows whether the purchaser expects a notification about the delivery of ordered goods from the vendor. The RequirementCode is of type GDT:FollowUpMessageCode.

In one implementation, the RequirementCode of the FollowUpDespatchedDelivery Notification entity 40904B has a value of 'expected' or 'unexpected.' In one implementation, the RequirementCode is set by the selling component.

(c) Follow-Up Billing Due Notification

A FollowUpBillingDueNotification is a notice that shows whether the selling component expects the procurement planning component to deliver logistical information after posting the goods issue in the Billing Engine (delivery-related billing document, in which commercial data from CRM and logistical data from the delivery are consolidated in the billing unit in the billing due list). The FollowUpBillingDueNotification entity 40906B includes a RequirementCode, which is a coded representation of the notice that shows whether the selling component expects the procurement planning component to deliver logistical information after posting of the goods issue in the billing unit. The RequirementCode is of type GDT: FollowUpMessageCode.

In one implementation, the RequirementCode of FollowUpBillingDueNotification entity 40906B entity 40904B has a value of 'expected' or 'unexpected.' In one implementation, the RequirementCode is set by the selling component.

(viii) Sales Order Fulfillment Item Package

The SalesOrderFulfillmentItem package 40936 groups a SalesOrderFulfillmentItem entity 40932B with the packages within the SalesOrderFulfillmentItem package 40936. The SalesOrderFulfillmentItem package 40936 includes a ProductInformation package 40914B, a Batch package 40916B, a Party package 40918B, a Location package 40920B, a DeliveryInformation package 40922B, a BusinessTransactionDocumentReference package 40924B, an Attachment package 40926B, a Description package 40928B, and a ScheduleLine package 40930B.

(a) Sales Order Fulfillment Item

The SaleOrderFulfillmentItem entity 40932B specifies a product transferred by the SaleOrderFulfillmentItem or additional information on such a product. The SaleOrderFulfillmentItem 40932B includes detailed information on a product (see ProductInformationPackage 40914B) and its batch (see Batch Package 40916B). The quantity of the product and the (delivery) date are specified in the schedule line (see ScheduleLine Package 40930B). Deviating parties, locations and delivery methods may be specified for the SaleOrderFulfillmentItem 40932B (compared to the information of the SaleOrderFulfillmentItem) (see Party Package 40918B, Location Package 40920B, DeliveryInformation Package 40922B). The SaleOrderFulfillmentItem may include references to other business documents that are relevant for the item (see BusinessTransactionDocumentReference Package 40924B). Furthermore, notes or references can be added as attachments (see Description Package 40928B or Attachment Package 40926B). A SaleOrderFulfillmentItem can be subordinate to another SaleOrderFulfillmentItem within a hierarchy in order to represent a business connection between the two items. This hierarchical relationship is reflected by the ItemHierarchyRelationship entity 40936B. This might, for example, be the addition of a free-goods discount or a substitute product to an ordered product.

The SaleOrderFulfillmentItem entity 40932B is of type GDT: SaleOrderFulfillmentItem. The SaleOrderFulfillmentItem entity 40932B includes an ID, a TypeCode, an ActionCode, a ScheduleLineListCompleteTransmissionIndicator, a CreationDateTime, a LastChangeDateTime, and an AcceptanceStatusCode. The ID is a unique identification issued by the seller for the item of a SaleOrderFulfillmentItem. The ID is of type GDT: BusinessTransactionDocumentItemID. The TypeCode is the document type of the requesting document. TypeCode is of type GDT: BusinessTransactionDocumentTypeCode. The ActionCode is the coded representation of a message request to the recipient to create, change, delete, or reject business objects. The ActionCode is of type GDT ActionCode. The ScheduleLineListCompleteTransmissionIndicator specifies whether the schedule lines of the requesting document are always transferred and non-transferred schedule lines implicitly count as rejected, or whether new and changed schedule lines as well as schedule lines that have been rejected since the last transfer are transferred. ScheduleLineListCompleteTransmissionIndicator is of type GDT CompleteTransmissionIndicator. The CreationDateTime is the creation time of the item of the requesting document. CreationDateTime is of type GDT DateTime. The LastChangeDateTime is the change date of the item of the requesting document. LastChangeDateTime is of type GDT DateTime. The AcceptanceStatusCode is the coded representation of the status of the agreement of the procurement planning unit. The AcceptanceStatusCode is of type GDT: AcceptanceStatusCode.

(b) Hierarchy Relationship

SaleOrderFulfillmentItem entities are arranged hierarchically using a Hierarchy Relationship entity 40936B. The Item Hierarchy Relationship 40936B is the relationship between a sub-item and a higher-level parent item in an item hierarchy. There is a 1:cn relationship 40938B between the SaleOrderFulfillmentItem entity 40932B and its subordinate entities, and there is a 1:c relationship 40940B between the SaleOrderFulfillmentItem entity 40932B and its superordinate entities. The HierarchyRelationship entity 40936B includes a ParentItemID and a TypeCode. The ParentItemID is the reference to the parent item. The ParentItemID is of type GDT: BusinessTransactionDocumentItemID. The TypeCode is the kind of relationship between a subitem and its hierarchically higher-level parent item. The TypeCode is of type GDT: BusinessTransactionDocumentItemHierarchyRelationshipTypeCode.

(c) Sales Order Fulfillment Item Product Information Package

The ProductInformation Package 40914B groups the information for identifying, describing, and classifying a product. The ProductInformation Package 40914B includes a Product entity 40942B and a ProductCategory entity 40944B. The SaleOrderFulfillmentItem entity 40932B has a respective 1:c relationship 40946B or 40948B with each of the Product entity 40942B and the ProductCategory entity 40944B.

(i) Product

A product includes the details about a product as generally understood from a commercial point of view in business documents. These are the details for identifying a product, product type as well as the description of the product. The product entity 40942B is of type GDT: BusinessTransactionDocumentProduct. In one implementation, the product to be procured is not be changed by the selling component. The procurement planning component may add a product number to a product description without a product number or specify a product for a newly proposed item.

(ii) Product Category

A ProductCategory includes the details about a product category as generally understood from a commercial point of view in business transaction documents. The ProductCategory includes details for identifying the product category using an internal ID, a standard ID along with IDs assigned by involved parties. The ProductCategory entity 40944B is of type GDT: BusinessTransactionDocumentProductCategory.

(d) Sales Order Fulfillment Item Batch Package

The Batch package 40916B groups all batch information on the product specified in a SaleOrderFulfillmentItem. The Batch package 40916B includes a Batch entity 40950B. The SaleOrderFulfillmentItem entity 40932B has a 1:c relationship 40952B with the Batch entity 40950B. The batch entity 40950B is a non-reproducible, homogenous subset of a product. The subset's chracteristics lie within the batch characteristics defined for the product. The Batch entity 40950B includes a BatchID, which is of type GDT: BatchID. A batch entity 40950B is either identified directly by its ID or described by its characteristics.

(e) Sales Order Fulfillment Item Party Package

The SaleOrderFulfillmentItem Item Party package 40918B is defined similary to Party package 40924. For example, SaleOrderFulfillmentItem Item Party package 40918B includes a BuyerParty item 40954B, a SellerParty item 40956B, a ProductRecipientParty item 40958B, a Vendor party entity 40959B, a Manufacturer Party entity 40960B, and a CarrierParty item 40962B. Each of these entities is defined similary to their corresponding counterpart in the Party package 40924 as indicated by elipses 40974B-82B. The SaleOrderFulfillmentItem entity 40932B has a respective 1:c relationship 40964B-40972B with each of these entities 40954B, 40956B, 40958B, 40959B, 40960B, and 40962B.

(f) Sales Order Fulfillment Item Location Package

The SaleOrderFulfillmentItem Item Location Package 40920B contains the ShipTo-Location entity 40984B and the ShipFrom-Location entity 40994B. Each of these entities 40984B and 40994B is defined similarly to their like-named counterpart in the Location Package 40926 as indicated by elipses 40992B and 40994B. The SaleOrderFulfillmentItem entity 40932B has a respective 1:c relationship 40988B, 40990B with each of the ShipTo-Location entity 40984B and the ShipFrom-Location entity 40994B.

(g) Sales Order Fulfillment Item Delivery Information Package

The SaleOrderFulfillmentItem Item DeliveryInformation package 22B includes the DeliveryTerms entity 40996B and the DeliveryControl entity 40998B. The SaleOrderFulfillmentItem entity 40932B has a respective 1:c relationship 40900C, 40902C with each of the DeliveryTerms entity 40996B and the DeliveryControl entity 40998B. Each of DeliveryTerms entity 40996B and the DeliveryControl entity 40998B is defined similarly to their like-named counterpart in the DeliveryInformation package 40928. For example, the DeliveryTerms entity 40996B has a 1:c relationship 40914C-40922C with an Incoterms entity 40914C, an PartialDelivery entity 40906C, an QuantityTolerance entity 40908C, an Transport entity 40910C, and an Description entity 40912C. Each of these entities 40914C, 40906C, 40908C, 40910C, and 40912C is defined similary to their like-named counterpart in the DeliveryInformation package 40928.

(h) Sales Order Fulfillment Item Business Transaction Document Reference Package The BusinessTransactionDocumentReference package 40924B groups all references to business documents that can occur for the SaleOrderFulfillmentItem and have a business connection to the item. The BusinessTransactionDocumentReference package 40924B includes a QuoteReference entity 40924C, a SalesContractReference entity 40926C, a PurchaseOrderReference entity 40928C, and an OriginPurchaseOrderReference entity 40930C. The SaleOrderFulfillmentItem entity 40932B has a 1:c relationship 40932C-40938C with each of these entities 40924C, 40926C, 40928C, and 40930C.

(i) Quote Reference

The QuoteReference is the reference to a quotation or an item within a quotation. The QuoteReference entity 40924C is of type GDT: BusinessTransactionDocumentReference.

(ii) Sales Contract Reference

The SalesContractReference is the reference to a sales contract or an item within a sales contract. The SalesContractReference entity 40926C is of type GDT: BusinessTransactionDocumentReference.

(iii) Purchase Order Reference

The PurchaseOrderReference is the reference to the PurchaseOrder or to an item within the PurchaseOrder. The PurchaseOrderReference entity 40928C is of type GDT: BusinessTransactionDocumentReference. The PurchaseOrderReference entity 40928C may make reference to the Buyer's order in the procurement planning component (for example, in the DespatchedDeliveryNotifcation).

(iv) Origin Purchase Order Reference

The OriginPurchaseOrderReference is the reference to the origin purchase order or to an item within the origin purchase order in a third-party business transaction. The OriginPurchaseOrderReference entity 40930C is of type GDT:BusinessTransactionDocumentReference. The OriginPurchaseOrderReference may be passed on through all PurchaseOrders so that the procurement planning component may refer to the original PurchaseOrder of the ProductRecipientParty via the OriginPurchaseOrderReference during the delivery.

(i) Sales Order Fulfillment Item Attachment Package

The SaleOrderFulfillmentItem Item Attachment Package 40926B is defined similarly to the Attachment package 40930 and includes the AttachmentWebAddress entity 40940C. The SaleOrderFulfillmentItem entity 40932B has a 1:cn relationship with the AttachmentWebAddress entity 40940C.

(j) Sales Order Fulfillment Item Description Package

The description package 40928B groups the texts to be described with reference to a SaleOrderFulfillmentItem. The description package 40928B includes a Description entity 40944C and a ConfirmationDescription 40946C. The SaleOrderFulfillmentItem entity 40932B has a respective 1:c relationship 40948C, 40950C with each of the Description entity 40944C and the ConfirmationDescription entity 40946C.

(i) Description

A Description is a text written in normal language that can be seen by parties with reference to the SaleOrderFulfillmentItem. The Description entity 40944C is of type GDT: Description. The Description entity 40944C can be used for all types of textual information that relates to the SalesOrderFulfillmentConfirmation. An example would be the packaging requested by a customer.

(ii) Confirmation Description

A ConfirmationDescription is a text written in normal language that can be seen by parties with reference to the SalesOrderFulfillmentConfirmationItem. The ConfirmationDescription entity 40946C is of type GDT: Description. The ConfirmationDescription can be used for all types of textual information that relates to an item in a SalesOrderFulfillmentConfirmation. An example would be an explanation from the procurement planning component as to why a substitution subitem was created.

(k) Sales Order Fulfillment Item Schedule Line Package

The ScheduleLine Package 40930B is the grouping of the quantity and date information on a SaleOrderFulfillmentItem. The ScheduleLine Package 40930B includes a ScheduleLine entity 40952C and a ConfirmedScheduleLine entity 40954C. SaleOrderFulfillmentItem entity 40932B has a 1:n relationship 40956C with the ScheduleLine entity 40952C and a 1:cn relationship 40958C with the ConfirmedScheduleLine entity 40954C. The ScheduleLine entity 40952C has a 1:c relationship 40962C with the DeliveryPeriod entity 40960C, and the ConfirmedScheduleLine entity 40954C has a 1:c relationship 40966C with the DeliveryPeriod entity 40964C.

(i) Schedule Line

The ScheduleLine is a line with the quantity and date of the provision schedule required by the selling system. The ScheduleLine entity 40952C includes an ID, an ActionCode, a Quantity, and a DeliveryPeriod. The ID is a unique identification issued by the vendor for the schedule line of a Sale- OrderFulfillmentItem, and is of type GDT BusinessTransactionDocumentItemScheduleLineID. The ActionCode is the coded representation of a message request to the recipient to create, change, delete, or reject business objects, and is of type GDT ActionCode. The Quantity is the requested or expected quantity in sales or order unit of measure, and is of type GDT Quantity. The DeliveryPeriod is the (planned) delivery period: expected or confirmed delivery date or period, and is of type GDT DateTimePeriod. The Quantity and the DeliveryPeriod may be changed by the selling component. The procurement planning component may specify a Quantity or DeliveryPeriod for an item that it has newly proposed itself.

(ii) Confirmed Schedule Line

The ConfirmedScheduleLine is a line with the quantity and date of the provision schedule confirmed via ATP and scheduling by the procurement planning component. A confirmation for a partial quantity cannot be equated with a rejection of the remaining quantity. The confirmation of a partial quantity merely means that the procurement planning component has accepted this partial quantity, and has not yet made a statement concerning the remaining quantity. The ConfirmedScheduleLine entity 40954C is defined similary to the ScheduleLine entity 40952C and has a 1:c relationship 40966C with the DeliveryPeriod entity 40964C.

(4) Message Data Type Element Structure

FIGS. 410A-M depict the element structure for a message data type SalesOrderFulfillmentMessage. The message data type SalesOrderFulfillmentMessage includes the object SaleOrderFulfillmentItem included in the business document and the business information that is relevant for sending a business document in a message. The element structure is similar to the above described data model of the message data type SalesOrderFulfillmentMessage as reflected in FIG. 409, but provides additional information regarding the details for interfacing with or implementing a SalesOrderFulfillmentMessage, such as a SalesOrderFulfillmentRequest and a SalesOrderFulfillmentConfirmation. As shown in FIGS. 410A-D, the element structure identifies the different packages 41000 that may be in a respective SalesOrderFulfillmentRequest and a SalesOrderFulfillmentConfirmation. The element structure for a SalesOrderFulfillmentRequest and a SalesOrderFulfillmentConfirmation includes five levels 41002, 41004, 41006, 41008, and 41010 each of which is associated with a respective package 41000. The element structure identifies the cardinality or occurrence 41012 and the data type 41014 information for the elements at the respective levels 41002, 41004, 41006, 41008, and 41010 in the respective package 41000.

The outermost package of this interface is a SaleOrderFulfillmentItem package 41016, which includes a SalesOrderFulfillmentMessage entity 41018 at the first level 41002. The SalesOrderFulfillmentMessage entity 41018 is of type MDT: SalesOrderFulfillmentMessage 41022. In one implementation, there is one 41020 SalesOrderFulfillmentMessage entity 41018 in the SaleOrderFulfillmentItem package 41016.

The SaleOrderFulfillmentItem package 41016 also includes a MessageHeader package 41024 and a SaleOrderFulfillmentItem package 41026. The MessageHeader package 41024 includes a MessageHeader entity 41028 that is of type GDT:BusinessDocumentMessageHeader 41032. In one implementation, there is one or zero 41030 MessageHeader entities 41028 for each SalesOrderFulfillmentMessage entity 41018.

The SaleOrderFulfillmentItem package 41026 includes a SaleOrderFulfillmentItem entity 41034 of type GDT:SaleOrderFulfillmentItem 41038. In one implementation, there is one or zero 41036 SaleOrderFulfillmentItem entity 41034 for each SalesOrderFulfillmentMessage entity 41018. The SaleOrderFulfillmentItem entity 41034 includes an ID 41040, a BaseBusinessTransactionDocumentID 41046, a BaseBusinessTransactionDocumentTypeCode 41052, an ActionCode 41058, an ItemListCompleteTransmissionIndicator 41064, a CreationDateTime 41070, a LastChangeDateTime 41076, and an AcceptanceStatusCode 41082. The ID 41040 is of type GDT:BusinessTransactionDocumentID 41044. The BaseBusinessTransactionDocumentID 41046 is of type GDT: BusinessTransactionDocumentID 41050. The BaseBusinessTransactionDocumentTypeCode 41052 is of type GDT: BusinessTransactionDocumentTypeCode 41056. The ActionCode 41058 is of type GDT:ActionCode 41062. The ItemListCompleteTransmissionIndicator 41064 is of type GDT:CompleteTransmissionIndicator 41068. The CreationDateTime 41070 is of type GDT:DateTime 41074. The LastChangeDateTime 41076 is of type GDT:DateTime 41080. The AcceptanceStatusCode 41082 is of type GDT: AcceptanceStatusCode 41086. In one implementation, for each SaleOrderFulfillmentItem entity 41034, there is one 41042 ID 41040, one or zero 41048 BaseBusinessTransactionDocumentID 41046, one or zero 41054 BaseBusinessTransactionDocumentTypeCode 41052, one or zero 41060 ActionCode 41058, one or zero 41066 ItemListCompleteTransmissionIndicator 41064, one or zero 41072 CreationDateTime 41070, one or zero 41078 LastChangeDateTime 41076, and one or zero 41084 AcceptanceStatusCode 41082.

The SaleOrderFulfillmentItem package 41026 also includes a Party package 41088, a Location package 41090, a DeliveryInformation package 41092, an Attachment package 41094, a Description package 41096, a FollowUpBusinessTransactionDocument or FollowUp package 41098, and a SaleOrderFulfillmentItem or Item Package 41000A.

As shown in FIG. 410B, the Party package 41088 includes a BuyerParty 41002A, a SellerParty 41020A, a ProductRecipientParty 41026A, a VendorParty 41032A, a ManufacturerParty 41038A, and a CarrierParty 41044A. The BuyerParty entity 41002A is of type GDT:BusinessTransactionDocumentParty 41006A. The SellerParty entity 41020A is of type GDT:BusinessTransactionDocumentParty 41024A. The ProductRecipientParty entity 41026A is of type GDT:BusinessTransactionDocumentParty 41030A. The VendorParty entity 41032A is of type GDT:BusinessTransactionDocumentParty 41036A. The ManufacturerParty entity 41038A is of type GDT:BusinessTransactionDocumentParty 41042A. The CarrierParty 41044A is of type GDT:BusinessTransactionDocumentParty 41048A. In one implementation, for each SaleOrderFulfillmentItem entity 41034, there is one 41004A BuyerParty 41002A, one 41022A SellerParty 41020A, one or zero 41028A ProductRecipientParty 41026A, one or zero 41034A VendorParty 41032A, one or zero 41040A ManufacturerParty 41038A, and one or zero 41046A CarrierParty 41044A.

The BuyerParty 41002A may include one 41010A InternalID 41008A of type GDT:PartyInternalID 41012A and any number 41016A of StandardIDs 41014A of type GDT:PartyInternalID 41018A. The SellerParty 41020A, the ProductRecipientParty 41026A, the VendorParty 41032A, and the ManufacturerParty 41038A, and a CarrierParty 41044A may each include elements similar to the BuyerParty 41002A, such as a respective InternalID and a respective one or more StandardIDs.

The Location package 41090 includes a ShipToLocation entity 41050A of type GDT:BusinessTransactionDocumentLocation 41054A and a ShipFromLocation entity 41062A of type GDT:BusinessTransactionDocumentLocation 41066A.

In one implementation, for each SaleOrderFulfillmentItem entity 41034, there is one or zero 41052A ShipToLocation entity 41050A and one or zero 41064A ShipFromLocation entity 41062A. The ShipToLocation entity 41050A includes one 41058A InternalID 41056A of type GDT:LocationID 41060A. The ShipFromLocation entity 41062A may include elements similar to the ShipToLocation entity 41050A, such as a respective InternalID.

The DeliveryInformation package 41092 includes a DeliveryTerms entity 41068A of type GDT:DeliveryTerms 41072A. There is one or zero 41070A DeliveryTerms entity 41068A for each SaleOrderFulfillmentItem entity 41034. The DeliveryTerms entity 41068A includes a DeliveryItemGroupID 41074A of type GDT:BusinessTransactionDocumentGroupID 41078A, a DeliveryPriorityCode 41080A of type GDT:BusinessTransactionDocumentPriorityCode 41084A, an Incoterms entity 41086A of type GDT:Incoterms 41090A, a PartialDelivery entity 41092A of type GDT:PartialDelivery 41096A, a QuantityTolerance entity 41098A of type GDT:QuantityTolerance 41002B, a Transport entity 41004B, and a Description entity 41008B of type GDT:Description 41012B. In one implementation, for each DeliveryTerms entity 41068A, there is one or zero 41076A DeliveryItemGroupID 41074A, one or zero 41082A DeliveryPriorityCode 41080A, one or zero 41088A Incoterms entity 41086A, one or zero 41094A PartialDelivery entity 41092A, one or zero 41000B QuantityTolerance entity 41098A, one or zero 41006B Transport entity 41004B, and one or zero 41010B Description entity 41008B.

The DeliveryInformation package 41092 also includes a DeliveryControl entity 41014B. There is one or zero 41016B DeliveryControl entity 41014B for each SaleOrderFulfillmentItem entity 41034. The DeliveryControl entity 41014B includes a DeliveryBlockedIndicator 41018B of type GDT:BusinessTransactionBlockedIndicator 41022B. There is one or zero 41020B DeliveryBlockedIndicator 41018B for each DeliveryControl entity 41014B.

The Attachment package 41094 includes an AttachmentWebAddress entity 41024B of type GDT:WebAddress 41028B. In one implementation, there is any number 41026B of AttachmentWebAddress entities 41024B for each AttachmentWebAddress entity 41024B.

The Description package 41096 includes a Description entity 41030B of type GDT:Description 41034B and a ConfirmationDescription entity 41036B of type GDT:Description 41040B. In one implementation, for each SaleOrderFulfillmentItem entity 41034, there is one or zero 41032B Description entity 41030B and one or zero 41038B ConfirmationDescription entity 41036B.

The FollowUpMessage ("FollowUp") package 41098 includes a FollowUpSalesOrderFulfillmentConfirmation entity 41042B, a FollowUpDespatchedDeliveryNotification entity 41052B, and a FollowUpBillingDueNotification entity 41062B. In one implementation, for each SaleOrderFulfillmentItem entity 41034, there is one or zero 41044B FollowUpSalesOrderFulfillmentConfirmation entity 41042B, one or zero 41054B FollowUpDespatchedDeliveryNotification entity 41052B, and one or zero 41064B FollowUpBillingDueNotification entity 41062B. The FollowUpSalesOrderFulfillmentConfirmation entity 41042B may have one 41048B RequirementCode 41046B of type GDT:FollowUpMessageRequirementCode 41050B. The FollowUpDespatchedDeliveryNotification entity 41052B may also have one 41058B RequirementCode 41056B of type GDT:FollowUpMessageRequirementCode 41060B. The FollowUpBillingDueNotification entity 41062B may also have one 41068B RequirementCode 41066B of type GDT:FollowUpMessageRequirementCode 41070B.

The SaleOrderFulfillmentItem or Item package 41000A includes an SaleOrderFulfillmentItem or Item entity 41072B of type GDT:SaleOrderFulfillmentItem 41076B. There is any number 41074B of Item entities 41072B for SaleOrderFulfillmentItem entity 41034. The Item 41072B includes an ID 41078B, a TypeCode 41084B, an ActionCode 41090B, a ScheduleLineListCompleteTransmissionIndicator 41096B, a CreationDateTime 41002C, a LastChangeDateTime 41008C, and an AcceptanceStatusCode 41014C. The ID 41078B is of type GDT:BusinessTransactionDocumentItemID 41082B. The TypeCode 41084B is of type GDT:BusinessTransactionDocumentTypeCode 41088B. The ActionCode 41090B is of type GDT:ActionCode 41094B. The ScheduleLineListCompleteTransmissionIndicator 41096B is of type GDT:CompleteTransmissionIndicator 41000C. The CreationDateTime 41002C is of type GDT:DateTime 41006C. The LastChangeDateTime 41008C is of type GDT:DateTime 41012C. The AcceptanceStatusCode 41014C is of type GDT:AcceptanceStatusCode 41018C. In one implementation, for each SaleOrderFulfillmentItem entity 41034, there is one 41080B ID 41078B, one 41086B TypeCode 41084B, one or zero 41092B ActionCode 41090B, one or zero 41098B ScheduleLineListCompleteTransmissionIndicator 41096B, one or zero 41004C CreationDateTime 41002C, one or zero 41010C LastChangeDateTime 41008C, and one or zero 41016C AcceptanceStatusCode 41014C.

Each Item 41072B also includes a HierarchyRelationship entity 41020C. In one implementation, there is one or zero 41022C HierarchyRelationship entities 41020C for each Item 41072B of the SaleOrderFulfillmentItem entity 41034. The HierarchyRelationship entity 41020C includes a ParentItemID 41024C of type GDT:BusinessTransactionDocumentItemID 41028C and a TypeCode 41030C of type GDT:BusinessTransactionDocumentItemHierarchyRelationshipTypeCode 41034C. In one implementation, for each HierarchyRelationship entity 41020C, there is one or zero 41026C ParentItemID 41024C and one 41032C TypeCode 41030C.

The SaleOrderFulfillmentItem or Item package 41000A also includes a ProductInformation package 41036C, a Batch package 41038C, a Party package 41040C, a Location package 41042C, a DeliveryInformation package 41044C, a BusinessTransactionDocumentReference or Reference package 41046C, an Attachment package 41048C, a Description package 41050C, and a ScheduleLine package 41052C.

The ProductInformation package 41036C includes a Product entity 41054C of type GDT:BusinessTransactionDocumentProduct 41058C and a ProductCategory entity 41084C of type GDT: BusinessTransactionDocumentProductCategory 41088C. In one implementation, for each Item entity 41072B, there is one 41056C Product entity 41054C and one or zero 41086C ProductCategory entity 41084C. The product entity 41054C includes an ID 41060C of type GDT:ProductID 41064C, a StandardID 41066C of CDT:ProductStandardID 41070C, a PartyID 41072C of type CDT:ProductPartyID 41076C, and a Description 41078C of type GDT:Description 41082C. In one implementation, for each Product entity 41054C, there is one or zero 41062C ID 41060C, one or zero 41068C StandardID 41066C, one or zero 41074C PartyID 41072C and one or zero 41080C Description 41078C.

The ProductCategory entity 41084C an ID 41090C of type GDT:ProductCategoryID 41094C. There may be one or zero 41092C ID 41090C for each ProductCategory entity 41084C.

The Batch package 41096C includes a Batch entity 41096C. In one implementation, there is one or zero 41098C Batch entity 41096C for each Item entity 41072B. The Batch entity 41096C includes an ID 41000D of type GDT:BatchID 41004D. There is one or zero 41002D ID 41000D for each Batch entity 41096C.

The SaleOrderFulfillmentItem Item Party package 41040C includes elements similar to Party package 41088. As shown in FIG. 4101, the Party package 41040C includes a BuyerParty 41006D, a SellerParty 41012D, a ProductRecipientParty 41018D, a VendorParty 41024D, a ManufacturerParty 41030D, and a CarrierParty 41036D. The BuyerParty entity 41006D is of type GDT:BusinessTransactionDocumentParty 41010D. The SellerParty entity 41012D is of type GDT:BusinessTransactionDocumentParty 41016D. The ProductRecipientParty entity 41018D is of type GDT:BusinessTransactionDocumentParty 41022D. The VendorParty entity 41024D is of type GDT:BusinessTransactionDocumentParty 41028D. The ManufacturerParty entity 41030D is of type GDT:BusinessTransactionDocumentParty 41034D. The CarrierParty 41036D is of type GDT:BusinessTransactionDocumentParty 41040D. In one implementation, for each SaleOrderFulfillmentItem Item entity 41072D, there is one 41008D BuyerParty 41006D, one 41014D SellerParty 41012D, one or zero 41020D ProductRecipientParty 41018D, one or zero 41026D VendorParty 41024D, one or zero 41032 ManufacturerParty 41030D, and one or zero 41038D CarrierParty 41036D. Each of these entities is defined similarly to their corresponding counterpart in the Party package 41088.

The SaleOrderFulfillmentItem Item Location Package 41042C includes elements similar to the Location Package 41090. The Location package 41042C includes a ShipToLocation entity 41042D of type GDT:BusinessTransactionDocumentLocation 41046D and a ShipFromLocation entity 41048D of type GDT:BusinessTransactionDocumentLocation 41052D. In one implementation, for each SaleOrderFulfillmentItem Item entity 41072B, there is one or zero 41044D ShipToLocation entity 41042D and one or zero 41050D ShipFromLocation entity 41048D. The ShipToLocation entity 41042D and the ShipFromLocation entity 41048D has elements similar to the corresponding entities, i.e., the ShipToLocation entity 41050A and the ShipToLocation entity 41062A.

The SaleOrderFulfillmentItem Item DeliveryInformation package 41044C includes elements similar to the DeliveryInformation package 41092. The DeliveryInformation package 41044C includes the DeliveryTerms entity 41054D of type GDT:DeliveryTerms 41058D. There is one or zero 41056D DeliveryTerms entity 41054D for each SaleOrderFulfillmentItem Item entity 41072B. The DeliveryTerms entity 41054D includes a DeliveryItemGroupID 41060D of type GDT:BusinessTransactionDocumentGroupID 41064D, a DeliveryPriorityCode 41066D of type GDT:BusinessTransactionDocumentPriorityCode 41070D, an Incoterms entity 41072D of type GDT:Incoterms 41076D, a PartialDelivery entity 41078D of type GDT:PartialDelivery 41082D, a QuantityTolerance entity 41084D of type GDT: QuantityTolerance 41088D, a Transport entity 41090D, and a Description entity 41094D of type GDT:Description 41098D. In one implementation, for each DeliveryTerms entity 41054D, there is one or zero 41062D DeliveryItemGroupID 41060D, one or zero 41068D DeliveryPriorityCode 41066D, one or zero 41074D Incoterms entity 41072D, one or zero 41080D PartialDelivery entity 41078D, one or zero 41086D QuantityTolerance entity 41084D, one or zero 41092D Transport entity 41090D, and one or zero 41096D Description entity 41096D.

The DeliveryInformation package 41044C also includes a DeliveryControl entity 41000E. There is one or zero 41002E DeliveryControl entity 41000E for each SaleOrderFulfillmentItem Item entity 41072B. The DeliveryControl entity 41000E includes a DeliveryBlockedIndicator 41004E of type GDT:BusinessTransactionBlockedIndicator 41008E. There is one or zero 41006E DeliveryBlockedIndicator 41004E.

The BusinessTransactionDocumentReference or Reference package 41046C includes a QuoteReference 41010E of type GDT: BusinessTransactionDocumentReference 41014E, a SalesContractReference 41016E of type GDT: BusinessTransactionDocumentReference 41020E, a PurchaseOrderReference 41022E of type GDT: BusinessTransactionDocumentReference 41026E, and an OriginPurchaseOrderReference 41034E of type GDT: BusinessTransactionDocumentReference 41038E. In one implementation, for each SaleOrderFulfillmentItem Item 41072B, there is one or zero 41012E QuoteReference 41010E, one or zero 41018E SalesContractReference 41016E, one or zero 41024E PurchaseOrderReference 41022E, and one or zero 41036E OriginPurchaseOrderReference 41034E.

The SaleOrderFulfillmentItem Item Attachment Package 41048C includes elements similar to the Attachment package 41094. The Attachment package 41048C includes an AttachmentWebAddress entity 41040E of type GDT:WebAddress 41044E. In one implementation, there is any number 41042E of AttachmentWebAddress entities 41040E for each AttachmentWebAddress entity 41040E.

The SaleOrderFulfillmentItem Item Description Package 41050C includes elements similar to the Description package 41096. The Description package 41050C includes a Description entity 41046E of type GDT:Description 41050E and a ConfirmationDescription entity 41052E of type GDT:Description 41056E. In one implementation, for each SaleOrderFulfillmentItem Item entity 41072B, there is one or zero 41048E Description entity 41046E and one or zero 41054E ConfirmationDescription entity 41052E.

The ScheduleLine Package 41052C includes a ScheduleLine entity 41058E of type GDT:SalesOrderFulfillmentItemScheduleLine 41062E and a ConfirmedScheduleLine entity 41088E of type GDT:SalesOrderFulfillmentItemScheduleLine 41092E. In one implementation, for each SaleOrderFulfillmentItem Item entity 41072B, there is one or more 41060E ScheduleLine entity 41058E and any number 41090E ConfirmedScheduledLine 41088E. Each ScheduleLine 41058E includes an ID 41064E of type GDT:ScheduleLineID 41068E, ActionCode 41070E of type GDT:ActionCode 41074E, Quantity 41076E of type GDT:Quantity 41080E, and DeliveryPeriod entity 41082E of type GDT: DateTimePeriod 41092E. In one implementation, for each SaleOrderFulfillmentItem Item entity 41072B, there is one or zero 41066E ID 41064E, one or zero 41072E ActionCode 41070E, one 41078E Quantity 41076E, and one or zero 41084E DeliveryPeriod entity 41082E.

The ConfirmedScheduleLine entity 41088E includes an ID 41094E of type GDT:ScheduleLineID 41098E, ActionCode 41000F of type GDT:ActionCode 41004F, Quantity 41006F of type GDT:Quantity 41010F, and a DeliveryPeriod entity 41012F of type GDT:DateTimePeriod 41016F. In one implementation, for each SaleOrderFulfillmentItem Item entity 41072B, there is one or zero 41096E ID 41094E, one or zero 41002F ActionCode 41000F, one 41008F Quantity 41006F, and one or zero 41014F DeliveryPeriod entity 41012F.

q) Delivery Interfaces

Delivery interfaces are used for the business scenarios Supplier Managed Inventory (SMI) and Release Processing as messages between a supplier and the Inventory Collaboration Hub (ICH) of a manufacturer and between the ICH and the back-end system of the manufacturer.

The business scenario Supplier Managed Inventory describes the planning and processing of replenishment deliveries for a manufacturer at a supplier. The supplier receives data about the existing stock and the current gross requirement for a product from the Inventory Collaboration Hub. The business scenario Release Processing is similar to the SMI scenario, regarding the message flow. However, the processing of replenishment deliveries from the manufacturer is triggered here by the publication of the manufacturer's net requirements for the products. This publication along with the receipt of the shipping notification for the resulting delivery also takes place with the Inventory Collaboration Hub.

(1) Message Types (a) Despatched Delivery Notification

A DespatchedDeliveryNotification is a notice for a goods recipient about the planned arrival/pickup/issue date for a ready-to-send delivery including details about the contents of the delivery. The structure of the message type DespatchedDeliveryNotification is specified in the message data type DespatchedDeliveryNotificationMessage. The DespatchedDeliveryNotification is often also known as the "Advanced Shipping Notification" (ASN). It is sent from a vendor (VendorParty) to a product recipient (ProductRecipientParty). The message transfer is generally complete ("complete transmission").

(b) Received Delivery Notification

A ReceivedDeliveryNotification is a message to the vendor about the arrival of the delivery he sent to the goods recipient, including details about the content of the received delivery. The structure of the message type ReceivedDeliveryNotification is specified in the message data type ReceivedDeliveryNotificationMessage. The ReceivedDeliveryNotification is also often known as the "Proof of Delivery" (POD). It is sent from a product recipient to a vendor. The message is used to notify the vendor about the receipt of his delivery. The message also enables you to report quantity variances of the arrived delivery at the shipper at item level. The message transfer is generally complete ("complete transmission").

(2) Message Cheorgraphy

The following message choreography describes a logical sequence of the message types for the scenario realization. A vendor notifies a goods recipient (Product Recipient) about his goods delivery with a DespatchedDeliveryNotification. The goods recipient (Product Recipient) confirms the receipt of a delivery from the vendor with a ReceivedDeliveryNotification.

(3) Message Data Type Despatched Delivery Notification

The message data type DespatchedDeliveryNotificationMessage includes the business information that is relevant for sending a business document in a message and the object Delivery included in the business document in the view of a DespatchedDeliveryNotification. It includes a MessageHeader package 41202 and a Delivery Package 41204. The message data type DespatchedDeliveryNotificationMessage makes the structure available for the message type DespatchedDeliveryNotification and the interfaces based on it.

(a) Message Header Package

A MessageHeader package 41204 groups the business information that is relevant for sending a business document in a message. It includes a MessageHeader entity 41206. The DispatchDeliveryNotificationMessage entity 41208 includes the MessageHeader entity 41206 and has a 1:1 relationship with it.

(i) Message Header

A MessageHeader entity 41206 groups the business information from the view of the sending application. It includes information to identify the business document in a message, information about the sender and, possibly, information about the recipient.

The MessageHeader entity 41206 includes a SenderParty entity 41210 and a RecipientParty entity 41212. It has a respective 1:c relationship with these entities. It is of type GDT: BusinessDocumentMessageHeader.

The MessageHeader entity 41206 includes an ID, a ReferenceID, and a CreationDateTime. The ID an identifier for the business document in a (technical) message, and is of type GDT: MessageID. The ReferenceID is an identifier for another business document in another (technical) message, and is of type GDT: MessageID. The CreationDateTime is the creation date and time of message, and is of type GDT: DateTime.

(ii) Sender Party

A SenderParty entity 41210 is responsible for sending a business document at business application level. The SenderParty entity 41210 is of type GDT: BusinessDocumentMessageHeaderParty.

(iii) Recipient Party

A RecipientParty entity 41212 is responsible for receiving a business document at business application level. The RecipientParty entity 41212 is of type GDT: BusinessDocumentMessageHeaderParty.

(b) Delivery Package

The Delivery Package 41204 groups the delivery and its packages. It includes a Party Package 41214, a Location Package, a TransportInformation Package, a DeliveryInformation Package 41220, a DeliveryItem Package 41222, and a HandlingUnit Package 41224.

(i) Delivery

The delivery entity 41226 in the view of a DespatchedDeliveryNotification describes when and where from a product is to be delivered or picked up, and the quantity. The DispatchedDeliveryNotificationMessage entity 41208 includes the Delivery entity 41226 and has a 1:1 relationship with it. A delivery entity 41226 generally includes of several items, which refer to the specifications for the quantity, weight, and volume for each delivered product, as well as preceding documents and/or outline agreements. Delivery includes an ID, a CreationDateTime, a GrossWeightMeasure, a NetWeightMeasure, a VolumeMeasure, an ArrivalDateTime, an IssueDateTime, a CarrierHandoverDateTime, a GroupID, a WayBillID, a TransportModeCode, a DangerousGoodsIndicator, and a Note.

The ID is an identifier for the delivery, and is of type GDT: BusinessTransactionDocumentID. The CreationDateTime is the creation time of delivery, and is of type GDT: DateTime. The GrossWeightMeasure is the gross weight of delivery, and is of type GDT: Measure. The NetWeightMeasure is the net weight of delivery, and is of type GDT: Measure. The VolumeMeasure is the volume of delivery, and is of type GDT: Measure. The ArrivalDateTime is the (estimated) arrival date/time of delivery, and is of type GDT: DateTime. The IssueDateTime is the (estimated) shipping date/time of delivery, and is of type GDT: DateTime. The CarrierHandoverDateTime is the time of goods transfer to carrier, and is of type GDT: DateTime. The GroupID is an identifier for a group of deliveries to which the existing delivery belongs, and is of type GDT: BusinessTransactionDocumentGroupID. The WayBillID is an identifier of bill of lading, and is of type GDT: BusinessTransactionDocumentID. The TransportModeCode is the encoded representation of transportation mode, and is of type GDT: TransportModeCode. The DangerousGoodsIndicator is the specification of whether delivery includes dangerous goods or not, and is of type GDT: DangerousGoodsIndicator. The Note is the note for delivery, and is of type GDT: Note.

(ii) Party Package

The Party Package 41214 is the grouping of the business partners that may be relevant within the shipping notification. It includes a VendorParty entity 41228, a ProductRecipientParty entity 41230, and a CarrierParty entity 41232. The Delivery entity 41226 includes these entities and has a respective 1:1 relationship with the VendorParty entities 41228 and the ProductRecipientParties entity 41230, and a 1:c relationship with the CarrierParty entities 41232.

(a) Vendor Party

VendorParty entity 41228 is the company or the person to deliver the notified products. VendorParty entity 41228 is of type GDT:BusinessTransactionDocumentParty, whereas only the InternalID, the StandardID, and the ProductRecipientID are used. For an internal communication, only use the InternalID is used for party entity types. For an interenterprise communication, for party entity types either the StandardID or the partner-role-specific ID of the receiving partner is used, in other words, for Supplier Collaboration scenarios the ProductRecipientID is used, and for Customer Collaboration scenarios, the VendorID is used. Due to the different possibilities for ID use, ID elements of the particular "Party" are optional.

(b) Product Recipient Party

ProductRecipientParty entity 41230 is the company or the person to take delivery of the notified products. ProductRecipientParty entity 41230 is of type GDT:BusinessTransactionDocumentParty, whereas the InternalID, the StandardID, and the ProductRecipientID are used. The use of the address of the ProductRecipientParty entity 41230 as the delivery address may not be intended in a delivery process in Supply Chain Planning and Execution. The ShipToLocation is intended for this.

(c) Carrier Party

CarrierParty entity 41232 is the company or person that/who transports the notified products. CarrierParty entity 41232 is of type GDT:BusinessTransactionDocumentParty, whereas the InternalID, the StandardID, and the ProductRecipientID are used.

(iii) Location Package

The Location Package 41216 is the grouping of the locations that may be relevant within the shipping notification. It includes a ShipFromLocation entity 41234 and a ShipToLocation entity 41236. The Delivery entity 41226 includes the ShipToLocation entity 41234 and the ShipFromLocation entity 41236. The Delivery entity 41226 has a 1:1 relationship with the ShipToLocation entity 41234 and a 1:c relationship with the ShipFromLocation entity 41236.

(a) Ship From Location

The ShipFromLocation entity 41234 is the place where the notified products to be delivered come from. The ShipFromLocation entity 41234 is of type GDT: BusinessTransactionDocumentShipFromLocation, whereas only the InternalID, the StandardID, the ProductRecipientID, and the VendorID are used. For an internal communication, the InternalID is used for location entity types. For an interenterprise communication, for location entity types, either the StandardID or the partner-role-specific ID of the receiving partner is used, in other words, for Supplier Collaboration scenarios the ProductRecipientID is used, and for Customer Collaboration scenarios, use the VendorID is used. Due to the different possibilities for ID use, ID elements of the particular "location" are optional.

(b) Ship To Location

The ShipToLocation entity 41236 is the place to where the notified products are delivered. The ShipToLocation entity 41236 is of type GDT: BusinessTransactionDocumentShipToLocation, whereas the InternalID, the StandardID, the ProductRecipientID, and the VendorID are used.

(iv) Transport Information Package

The TransportInformation Package 41218 is the summary of transportation information that may be relevant within the shipping notification. It includes a TransportMeans entity 41238 and a TransportTracking entity 41240. The Delivery entity 41226 includes the TransportMeans entity 41238 and the TransportTracking entity 41240. It has a 1:c relationship with these entities.

(a) Transport Means

The TransportMeans entity 41238 is the description of a means of transport and can also include information for a more detailed identification. The TransportMeans entity 41238 is of type GDT: TransportMeans.

(b) Transport Tracking

The TransportTracking entity 41240 delivers transport-related information that can be used for tracking deliveries, for example, in goods deliveries. The TransportTracking entity 41240 is of type GDT: TransportTracking.

(v) Delivery Information Package

The DeliveryInformation Package 41220 is the summary of delivery information that may be relevant within the shipping notification. It includes The Incoterms entity 41242. The Delivery entity 41226 includes the Incoterms entity 41242 and has a 1:c relationship with it.

The Incoterms entity 41242 is a commercial contract formula for the delivery conditions that correspond with the rules compiled by the International Chamber of Commerce (ICC). The Incoterms entity 41242 is of type GDT: Incoterms.

(vi) Delivery Item Package

The DeliveryItem Package 41222 is a grouping of items of a notified delivery, which includes specifications for the quantity of a product to be delivered/picked up. It includes a BusinessTransactionDocumentReference package 41244 and a ProductInformation package 41246.

(a) Delivery Item

DeliveryItem entity 41248 describes what quantity of a product is to be delivered/picked up. The DeliveryItem entity 41248 includes an ID, a ConsignmentIndicator, a GrossWeightMeasure, a NetWeightMeasure, a VolumeMeasure, a Quantity, Dangerous Goods, and a Note. The Delivery entity 41226 includes the DeliveryItem entity 41248 and has 1:cn relationship with it.

The ID is the identifier for the item in the delivery, which is of type GDT:BusinessTransactionDocumentItemID. The ConsignmentIndicator is the specification whether the item is intended for the consignment stock or not, which is of type GDT:ConsignmentIndicator. The GrossWeightMeasure is the gross weight of products in the delivery item, which is of type GDT: Measure. The NetWeightMeasure is the net weight of products in the delivery item, which is of type GDT: Measure. The VolumeMeasure is the volume of products in the delivery item, which is of type GDT: Measure. The Quantity is the quantity of product in the delivery item, which is of type GDT:Quantity. The Dangerous Goods is the classification of a dangerous goods in the delivery item, which is of type GDT:DangerousGoods. The Note is the note for item of delivery, which is of type GDT: Note.

(b) Business Transaction Document Reference Package

The BusinessTransactionDocumentReference package 41244 is a grouping of references to other business documents that may occur in the shipping notification. It includes a PurchaseOrderReference, a SchedulingAgreementReference, and a SalesOrderReference. The DeliveryItem entity 41248 includes the PurchaseOrder Reference entity 41250, the SchedulingAgreementReference entity 41252 and the SalesOrderReference entity 41254 and has a respective 1:c relationship with these entities.

(i) Purchase Order Reference

The PurchaseOrderReference entity 41250 is the reference to a purchase order or an item within a purchase order. PurchaseOrderReference is of type GDT:BusinessTransactionDocumentReference. The PurchaseOrderReference entity 41250 includes the purchase order number and purchase order item number specified by the buyer.

(ii) Scheduling Agreement Reference

The SchedulingAgreementReference entity 41252 is the reference to an outline agreement. According to the rules of the outline agreement, products are procured on predefined dates within a time period. The SchedulingAgreementReference entity 41252 is of type GDT:BusinessTransactionDocumentReference.

(iii) Sales Order Reference

The SalesOrderReference entity 41254 is the reference to an order or an item within an order. The SalesOrderReference entity 41254 is of type GDT:BusinessTransactionDocumentReference. SalesOrderReference includes the order number and order item number specified by the vendor.

(c) Product Information Package

The ProductInformation package 41246 is a group of information that characterizes the product in a delivery in detail. It includes a Product entity 41256 and a Batch entity 41258. The DeliveryItem entity 41248 includes the Product entity 41256 and the Batch entity 41258, and has a 1:1 relationship with the Product entity 41256 and a 1:c relationship with the Batch entity 41258.

(i) Product

Product entity 41256 includes specifications to identify a delivered product and to track manufacture-related changes to the product. Product entity 41256 is of type GDT: BusinessTransactionDocumentProduct, whereas the InternalID, the StandardID, the ProductRecipientID, and the VendorID are used together with the ChangeNumber and, if necessary, the note. For an internal communication, the InternalID is used for product entity types. For an interenterprise communication, for product entity types, either the StandardID or the partner-role-specific ID of the receiving partner is used, in other words, for Supplier Collaboration scenarios the ProductRecipientID is used, and for Customer Collaboration scenarios the VendorID is used. Due to the different possibilities for ID use, ID elements of the particular 'product' are optional.

(ii) Batch

Batch entity 41258 is a batch in the delivery item. Batch entity 41258 includes an InternalID, a VendorID, a ProductRecipientID, a ManufacturingDate, a BestBeforeDate, and an OriginCountryCode.

The InternalID is the proprietary identifier for the batch, and is of type GDT: BatchID. The VendorID is an unique identifier used by the VendorParty for the batch, and is of type GDT: BatchID. The ProductRecipientID is an unique identifier used by the ProductRecipientParty entity 41230 for the batch, and is of type GDT: BatchID. The ManufacturingDate is the date of manufacture of the batch, and is of type GDT: Date. The BestBeforeDate is the best-before date of batch, and is of type GDT: Date. The OriginCountryCode is the encoded representation of country of origin of batch, and is of type GDT: CountryCode.

(vii) Handling Unit Package

The HandlingUnit Package 41224 is the summary of information that characterizes in detail how the delivery is packed or to be packed. It includes a HandlingUnit entity 41260. The DeliveryItem entity 41248 includes the HandlingUnit entity 41260 and has a 1:cn relationship with it.

HandlingUnit entity 41260 is a physical unit of packaging materials (load carrier, additional packaging materials) and the packaged products (of type "Material"). HandlingUnit entity 41260 is of type GDT:HandlingUnit.

(4) Message Data Type Received Delivery Notification

The message data type ReceivedDeliveryNotificationMessage groups the business information that is relevant for sending a business document in a message and the object Delivery included in the business document in the view of a ReceivedDeliveryNotification. It includes a MessageHeader package 41320 and a DeliveryPackage 41304. The message data type ReceivedDeliveryNotificationMessage makes the structure available for the message type ReceivedDeliveryNotification and the interfaces based on it.

(a) Message Header Package

A MessageHeader package 41302 groups the business information that is relevant for sending a business document in a message. The MessageHeader 41302 may not be required in the ReceivedDeliveryNotification.

(b) Delivery Package

The Delivery Package 41304 groups the delivery and its packages. It includes a Party Package 41306, a Location Package 41308, and a ReceivedDeliveryItem Package 41310.

(i) Delivery

The Delivery entity 41312 in the view of a ReceivedDeliveryNotification is the detailed confirmation of the receipt of a delivery. The ReceivedDeliveryNotificationMessage entity 41314 includes the Delivery entity 41312 and has a 1:1 relationship with it. Delivery entity 41312 includes an ID and a ReceiptDateTime. The ID is an identifier for the delivery, and is of type GDT: BusinessTransactionDocumentID. The ReceiptDateTime is the time of arrival of delivery according to the goods receipt posting, and is of type GDT:DateTime. The received delivery can vary from a delivery specified on a delivery note/previously notified by a DespatchedDeliveryNotification delivery (for example, varying quantities as a result of damages to the transport, varying arrival time).

(ii) Party Package

The Party Package 41306 is the grouping of the business partners that may be relevant within the notification about receipt of delivery. It includes a VendorParty entity 41316 and a ProductRecipientParty entity 41318. The Delivery entity 41312 includes the VendorParty entity 41316 and the ProductReipientParty entity 41318 and has a respective 1:1 relationship with these entities.

(a) Vendor Party

VendorParty entity 41316 is the company or the person that/who delivered the products. VendorParty entity 41316 is of type GDT:BusinessTransactionDocumentParty, whereas the InternalID, the StandardID, and the ProductRecipientID are used. For an internal communication, the InternalID is used for party entity types. For an interenterprise communication, for party entity types, either the StandardID or the partner-role-specific ID of the receiving partner is used, in other words, for Supplier Collaboration scenarios the ProductRecipientID is used, and for Customer Collaboration scenarios, the VendorID is used. Due to the different possibilities for ID use, ID elements of the particular "Party" are optional.

(b) Product Recipient Party

ProductRecipientParty entity 41318 is the company or the person that/who took delivery of the products. ProductRecipientParty entity 41318 is of type GDT:BusinessTransactionDocumentParty, whereas the InternalID, the StandardID, and the ProductRecipientID are used. The use of the address of the ProductRecipientParty entity 41318 as the delivery address may not be intended in a delivery process in Supply Chain Planning and Execution. The ShipToLocation is intended for this.

(iii) Location Package

The Location Package 41308 is the grouping of the locations that may be relevant within the notification about receipt of delivery. It includes a ShipFromLocation and a ShipToLocation entity 41320.

ShipToLocation entity 41320 is the place to where the products were delivered. ShipToLocation entity 41320 is of type GDT: BusinessTransactionDocumentShipToLocation, whereas the InternalID, the StandardID, the ProductRecipientID, and the VendorID are used. For an internal communication, the InternalID is used for location entity types. For an interenterprise communication, for location entity types, either the StandardID or the partner-role-specific ID of the receiving partner is used, in other words, for Supplier Collaboration scenarios the ProductRecipientID is used, and for Customer Collaboration scenarios the VendorID is used. Due to the different possibilities for ID use, ID elements of the particular "location" are optional.

(iv) Delivery Item Package

The DeliveryItem Package 41310 is a grouping of the DeliveryItem entity 41322 and its packages. It includes a ProductInformation Package 41324 and a DeliveryInformation Package 41326. The Delivery entity 41312 includes the DeliveryItem entity 41322 and has a 1:cn relationship with it.

(a) Delivery Item

DeliveryItem entity 41322 describes which quantity of a product has been received. DeliveryItem entity 41322 includes an ID, a CompletedIndicator, an InventoryStatusDateTime, and a ReceivedQuantity. The ID is an identifier for the item of the delivery received, which is of type GDT: BusinessTransactionDocumentItemID. The CompletedIndicator is the specification whether the delivery is completed from the recipient's point of view. This may also be the case if a quantity below the desired or notified quantity of the product has arrived, which is of type GDT: BusinessTransactionBlockedIndicator. The InventoryStatusDateTime is the date and time at which the goods receipt is posted into the warehouse stock, which is of type GDT: InventoryStatusDateTime. The ReceivedQuantity is the actual received quantity of the product, which is of type GDT: Quantity.

ReceiptDateTime is the time of the goods receipt posting, InventoryStatusDateTime is the time of the update for the goods receipt in the warehouse stock. As the update of the warehouse stock can take place later than the goods receipt posting, these dates may vary from each other, whereupon the InventoryStatusDateTime lies after the ReceiptDateTime. The InventoryStatusDateTime is required to ensure data consistency at the recipient of the ReceivedDeliveryNotification.

(b) Product Information Package

The ProductInformation package 41324 is a grouping of information that characterizes the product in a delivery in detail. It includes a Product entity 41328. The DeliveryItem entity 41322 includes the Product entities 41328 and has a 1:1 relationship with it.

Product entity 41328 includes the specifications for identifying a delivered product. Product is of type GDT: BusinessTransactionDocumentProduct, whereas the InternalID, the StandardID, the ProductRecipientID, and the VendorID are used. For an internal communication, the InternalID is used for product entity types. For an interenterprise communication, for product entity types, either the StandardID or the partner-role-specific ID of the receiving partner is used, in other words, for Supplier Collaboration scenarios the ProductRecipientID is used, and for Customer Collaboration scenarios, the VendorID is used. Due to the different possibilities for ID use, ID elements of the particular 'product' are optional.

(c) Delivery Information Package

The DeliveryInformation Package 41326 is the summary of delivery information about a product. It includes a Variance entity 41330. The DeliveryItem entity 41322 includes the Variance entity 41330 and has a 1:cn relationship with it. Variance describes a variance in the received quantity of a product and type of and reason for the variance. The Variance entity 41330 includes a Quantity and a QuantityDiscrepancyCode. The Quantity is the quantity deviation from the shipping notification (difference). This may be specified without a sign. It can be determined whether too much or too little was delivered from the following QuantityDiscrepancyCode, which is of type GDT: Quantity. The QuantityDiscrepancyCode is the encoded representation of type of and reason for the deviation at the received product, which is of type GDT: QuantityDiscrepancyCode.

(5) Element Structure (a) Despatched Delivery Notification

FIG. 414 depict the element structure for DespatchedDeliveryNotification. The element structure is similar to the data model, but provides additional information regarding the details of the interface. The element structure identifies the different packages 41400 in the interface, and represents the entities at various levels within the interface. As depicted in FIGS. 414-414, the interface for DespatchedDeliveryNotification includes five levels 41402, 41404, 41406, 41408, and 41410. The element structure identifies the cardinality 41412 between the entities of the interface, and provides information (i.e., type 41414) regarding the data type that provides the basis for the entity. The outermost package of this interface is a DespatchedDeliveryNotificationMessage package 41416, which includes a DespatchedDeliveryNotificationMessage entity 41418 at the first level 41402. The DespatchedDeliveryNotificationMessage entity 41418 is of type message data type ("MDT") 41414 "DespatchedDeliveryNotificationMessage" 41422 and there is one or zero 41420 occurrences.

The DespatchedDeliveryNotificationMessage package 41416 includes a MessageHeader package 41424 and a Delivery package 41426. The MessageHeader package 41424 includes a MessageHeader entity 41428, which is of type generic data type ("AGDT") 41414 "MessageHeader" 41432. There is one or zero 41430 MessageHeader entity 41428 for each DespatchedDeliveryNotificationMessage package 41424.

The MessageHeader entity 41428 includes a MessageID 41434 and a CreationDateTime 41440. The MessageID 41434 is of type GDT 41414 MessageID 41438. The CreationDateTime 41440 is of type GDT 41414 DateTime 41444. There is one 41436 MessageID 41434 for each MessageHeader entity 41428, one or zero 41442 CreationDateTime 41440 for each MessageHeader entity 41428.

The MessageHeader entity 41428 also includes a SenderParty entity 41446 and a RecipientParty entity 41452. The SenderParty entity 41446 is of type AGDT 41414 BusinessDocumentMessageHeaderParty 41450. The RecipientParty entity 41452 is also of type AGDT 41414 BusinessDocumentMessageHeaderParty 41456. There is one or zero 41448 SenderParty entity 41446 for each MessageHeader entity 41428, and there is one or zero 41454 RecipientParty entity 41452 for each MessageHeader entity 41428.

The Delivery package 41426 includes a Delivery entity 41458, a Party package 41442A, Location package 41444A, TransportInformation package 41446A, DeliveryInformation package 41448A, Item package 41450A, and HandlingUnit package 41450C. There is one 41460 Delivery entity 41458 for each DespatchedDeliveryNotificationMessage package 41426. The Delivery entity 41458 includes an ID 41464, a CreationDateTime 41470, a GrossWeightMeasure 41476, a NetWeightMeasure 41482, a VolumeMeasure 41488, an ArrivalDateTime 41494, IssueDateTime 41400A, CarrierHandoverDateTime 41406A, GroupID 41412A, WayBillID 41418A, a TransportModeCode 41424A, a DangerousGoodsIndicator 41430A, and a Note 41436A.

There is one 41466 ID 41464 for each Delivery entity 41458. The ID 41464 is of type GDT 41414 BusinessTransactionDocumentID 41474. A CreationDateTime 41470 has one 41472 occurrence and is of type GDT 41414 DateTime 41474. GrossWeightMeasure 41476 has zero or one 41478 occurrences and is of type GDT 41414 Measure 41480. NetWeightMeasure 41482 has zero or one 41484 occurrences and is of type GDT 41414 Measure 41486. VolumeMeasure 41488 has zero or one 41490 occurrences and is of type GDT 41414 Measure 41492. ArrivalDateTime 41494 has zero or one 41496 occurrences and is of type GDT 41414 DateTime 41498. IssueDateTime 41400A has zero or one 41402A occurrences and is of type GDT 41414 DateTime 41404A. CarrierHandoverDateTime 41406A has zero or one 41408A occurrences and is of type GDT 41414 DateTime 41410A. GroupID 41412A has zero or one 41414A occurrences and is of type GDT 41414 BusinessTransactionDocumentGroupID 41416A. WayBillID 41418A has zero or one 41420A occurrences and is of type GDT 41414 BusinessTransactionDocumentID 41422A. TransportModeCode 41424A has zero or one 41426A occurrences and is of type GDT 41414 TransportModeCode 41428A. DangerousGoodsIndicator 41430A has zero or one 41432A occurrences and is of type GDT 41414 DangerousGoodsIndicator 41434A. Note 41436A has zero or one 41438A occurrences and is of type GDT 41414 Note 41440A.

The Party package 41442A includes a VendorParty entity 41452A, a ProductRecipientParty entity 41458A, and a CarrierParty entity 41464A. The VendorParty entity 41452A is of type AGDT 41414 BusinessTransactionDocumentParty 41456A. There is one 41454A VendorParty entity 41452A for each Party package 41442A. There is one 41460A ProductRecipientParty entity 41458A for each Party package 42A 414. The ProductRecipientParty entity 58A is of type AGDT 41414 BusinessTransactionDocumentParty 41462A. The CarrierParty entity 41464A is of type GDT 41414 BusinessTransactionDocumentParty 41468A. There is one or zero 41466A CarrierParty entity 41464A for each Party package 41442A.

The Location package 41444A includes a ShipFromLocation entity 41470A and a ShipToLocation entity 41476A. The ShipFromLocation entity 41470A is of type GDT 41414 BusinessTransactionDocumentShipFromLocation 41474A. There is one or zero 41472A ShipFromLocation entity 41470A for each Location package 41444A. The ShipToLocation entity 41476A is of type GDT 41414 BusinessTransactionDocumentShipToLocation 41480A. There is one 41478A ShipToLocation entity 41476A for each Location package 41444A.

The TransportInformation package 41446A includes a TransportMeans entity 41482A and a TransportTracking entity 41488A. The TransportMeans entity 41482A is of type GDT 41414 TransportMeans 41486A, and there is one or zero 41484A TransportMeans entity 41482A for each TransportInformation package 41446A. The TransportTracking entity 41488A is of type GDT 41414 TransportTracking 41492A, and there is one or zero 41490A TransportTracking entity 41488A for each TransportInformation package 41446A.

The DeliveryInformation package 414048A includes an Incoterms entity 41494A which is of type GDT 41414 Incoterms 41498A. There is one or zero 41496A Incoterms entity 41494A.

The Item package 41450A includes an Item entity 41400B. There is one or more 41402B Item entities 41400B for each Item package 41450A. The Item entity 41400B includes an ID 41406B, a ConsignmentIndicator 41412B, a GrossWeightMeasure 41418B, a NetWeightMeasure 41424B, a VolumeMeasure 41430B, a Quantity 41436B, a DangerousGoodsIndicator 41442B, and a Note 41448B.

There is one or zero 41408B ID 41406B for each Item entity 41400B. The ID 41406B is of type GDT 41414 BusinessTransactionDocumentItemID 41441410B. A ConsignmentIndicator 41412B has one or zero 414 14B occurrences and is of type GDT 41414 ConsignmentIndicator 41416B. GrossWeightMeasure 41418B has zero or one 41420B occurrences and is of type GDT 41414 Measure 41422B. NetWeightMeasure 41424B has zero or one 41426B occurrences and is of type GDT 41414 Measure 41428B. VolumeMeasure 41430B has zero or one 41432B occurrences and is of type GDT 41414 Measure 41434B. Quantity 41436B has zero or one 41438B occurrences and is of type GDT 41414 Quantity 41440B. DangerousGoods 41442B has zero or one 41444B occurrences and is of type GDT 41414 DangerousGoods 41446B. Note 41448B has zero or one 41450B occurrences and is of type GDT 41418 Note 41452B.

The Item package 41450B also includes a BusinessTransactionDocumentReference package 41454B and a ProductInformation package 41456B. The BusinessTransactionDocumentReference package 41454B includes a PurchaseOrderReference entity 41458B. The PurchaseOrderReference entity 41458B is of type GDT 41414 BusinessTransactionDocumentReference 41462B. There is one or zero 41460B PurchaseOrderReference entities 41458B for each BusinessTransactionDocumentReference package 41454B. The BusinessTransactionDocumentReference package 41454B includes a SchedulingAgreementReference entity 41464B. The SchedulingAgreementReference entity 41464B is of type GDT 41414 BusinessTransactionDocumentReference 41468B. There is one or zero 41466B SchedulingAgreementReference entities 41464B for each BusinessTransactionDocumentReference package 41454B. The BusinessTransactionDocumentReference package 41454B includes a SalesOrderReference entity 41470B. The SalesOrderReference entity 41470B is of type GDT 41414 SalesOrderReference 41474B. There is one or zero 41472B SalesOrderReference entities 41470B for each BusinessTransactionDocumentReference package 41454B.

The ProductInformation package 41456B includes a Product entity 41476B and a Batch entity 41418C. The Product entity 41476B is of type GDT 41414 BusinessTransactionDocumentProduct 41480B. There is one or zero 41478B Product entity 41476B for each ProductInformation package 41456B. There is one or zero 41420C Batch entity 41418C for each ProductInformation package 41456B.

The Product entity 41476B includes an InternalID 41482B, a StandardID 41488B, a ShipperID 41494B, a ConsigneeID 41400C, a ChangeID 41406C, and a Note 41412C. The InternalID 41482B has zero or one 41484B occurrences and a data type of CDT 41414 ProductInternalID 41486B. The StandardID 41488B of the Product entity 41476B has zero or one 41490B occurrences and has a data type of CDT 41414 ProductStandardID 41492B. The ShipperID 41494B has zero or one 41496B occurrences and a data type of CDT 41414 ProductPartyID 41498B. The ConsigneeID 41400C has zero or one 41402C occurrences and a data type of CDT 41414 ProductPartyID 41404C. The ChangeID 41406C has zero or one 41408C occurrences and a data type of CDT 41414 ProductChangeID 41410C. The Note 41412C has zero or one 41414C occurrences and a data type of CDT 41414 Note 41416C.

The Batch entity 41418C includes an InternalID 41422C, a ShipperID 41428C, a ConsigneeID 41434C, a ManufacuringDate 41440C, a BestBeforeDate 41446C, and a OriginCountryCode 41452C. The InternalID 41422C has zero or one 41424C occurrences and has a data type of CDT 41414 BatchID 41426C. The ShipperID 41428C has zero or one 41430C occurrences and has a data type of CDT 41414 BatchID 41432C. The ConsigneeID 41434C has zero or one 41436C occurrences and has a data type of CDT 41414 BatchID 41438C. The ManufacturingDate 41440C has zero or one 41442C occurrences and a data type of CDT 41414 Date 41444C. The BestBeforeDate 41446C has zero or one 41448C occurrences and a data type of CDT 41414 Date 41450C. The OriginCountryCode 41452C has zero or one 41454C occurrences and a data type of CDT 41414 CountryCode 41456C.

The HandlingUnit package 41458C includes a HandlingUnit entity 41460C having any number 41441441462C of occurrences and a data type 41414 of HandlingUnit 41464C.

(b) Received Delivery Notification

FIG. 415 depict the element structure for ReceivedDeliveryNotification. The element structure is similar to the data model, but provides additional information regarding the details of the interface. The element structure identifies the different packages 41500 in the interface, and represents the entities at various levels within the interface. As depicted in FIGS. 415-415, the interface for ReceivedDeliveryNotification includes five levels 41502, 41504, 41506, 41508, and 41510. The element structure identifies the cardinality 41512 between the entities of the interface, and provides information (i.e., type 41514) regarding the data type that provides the basis for the entity. The outermost package of this interface is a ReceivedDeliveryNotificationMessage package 41516, which includes a ReceivedDeliveryNotificationMessage entity 41518 at the first level 41502. The ReceivedDeliveryNotificationMessage entity 41518 is of type message data type ("MDT") 41514 "ReceivedDeliveryNotificationMessage" 41520 and there is one or zero 41541526 occurrences.

The ReceivedDeliveryNotificationMessage package 41516 includes a Delivery package 41522. The Delivery package 41522 includes a Delivery entity 41524, a Party package 41542, Location package 41544, and an Item package 41546. There is one 41526 Delivery entity 41524 for each Delivery package 41522. The Delivery entity 41524 includes an ID 41530, and a ReceiptDateTime 41536. There is one 41532 ID 41530 for each Delivery entity 41524. The ID 41530 is of type GDT 41514 BusinessTransactionDocumentID 41534. A ReceiptDateTime 41536 has one or zero 415 38 occurrences and is of type GDT 41514 DateTime 41540.

The Party package 41542 includes a VendorParty entity 41548 and a ProductRecipientParty entity 41554. The VendorParty entity 41548 is of type AGDT 41514 BusinessTransactionDocumentParty 41552. There is one 41550 VendorParty entity 41548 for each Party package 41542. There is one 41556 ProductRecipientParty entity 41554 for each Party package 41542. The ProductRecipientParty entity 41554 is of type AGDT 41514 BusinessTransactionDocumentParty 41558.

The Location package 41544 includes a ShipToLocation entity 41560. The ShipToLocation entity 41560 is of type GDT 41514 BusinessTransactionDocumentShipToLocation 41564. There is one or zero 41562 ShipToLocation entities 41560 for each Location package 41544.

The Item package 41546 includes an Item entity 41566. There is any number 41568 of Item entities 41566 for each Item package 41546. The Item entity 41566 includes an ID 41570, a CompletedIndicator 41576, an InventoryStatusDateTime 41582, and a ReceivedQuantity 41588.

There is one or zero 41572 ID 41570 for each Item package 41546. The ID 41570 is of type GDT 41514 BusinessTransactionDocumentItemID 41574. A CompletedIndicator 41576 has one or zero 41578 occurrences and is of type GDT 41514 BusinessTransactionBlockedIndicator 41580. InventoryStatusDateTime 41582 has zero or one 41584 occurrences and is of type GDT 41514 DateTime 41586. ReceivedQuantity 41588 has one 41590 occurrence and is of type GDT 41514 Quantity 41592.

The Item package 41546 also includes a ProductInformation package 41594 and a DeliveryInformation package 41596. The ProductInformation package 41594 includes a Product entity 41598. The Product entity 41598 is of type GDT 41514 BusinessTransactionDocumentProduct 41502A. There is one 41500A Product entity 41598 for each ProductInformation package 41594.

The Product entity 41598 includes an InternalID 41504A, a StandardID 41510A, a ShipperID 41516A, and a ConsigneeID 41522A. The InternalID 41504A has zero or one 41506A occurrences and a data type of CDT 41514 ProductInternalID 41508A. The StandardID 41510A of the Product entity 41598 has zero or one 41541512A occurrences and has a data type of CDT 41514 ProductStandardID 41514A. The ShipperID 41516A has zero or one 41518A occurrences and a data type of CDT 41514 ProductPartyID 41520A. The ConsigneeID 41522A has zero or one 41524A occurrences and a data type of CDT 41514 ProductPartyID 41526A.

The DeliveryInformation package 41596 includes a Variance entity 41528A. There is any number 41530A Variance entities 41528A. The Variance entity 41528A includes a Quantity 41532A having one 41534A occurrence and having a type 41514 of Quantity 41536A. The Variance entity 41528A includes a QuantityDiscrepancyCode 41538A having one 41540A occurrence and having a type 41514 of QuantityDiscrepancyCode 41542A.

r) Invoice Accounting Interface

The motivating business scenarios for the InvoiceAccountingNotification interface are Sell from Stock and Procure from Stock. After an vendor invoice is checked in BAC Invoicing, a message is sent to BAC Accounting to update the payables to the vendors, the receivables from tax, and the expenses. Similarly, when a billing document is sent in BAC Billing, a message is sent to BAC Accounting to post the receivables from delivery, the payables from tax, and the revenues.

(1) Message Type Invoice Accounting Notification

An InvoiceAccountingNotification is a message for transferring information about incoming and outgoing payments from invoice verification and billing to Accounting. The message type InvoiceAccountingNotification is based on the message data type InvoiceAccountingMessage.

The requirements from Accounting are fulfilled with the information in the message. This includes: (1) Creation of an accounting document in the relevant legal unit in accordance with generally accepted accounting principles; (2) Assignment of primary expenses and revenues in accordance with the requirements of cost and revenue accounting; and (3) Linking the business transactions (purchase order/order with invoice) so that, for example, audit requirements are met, but also, for example, so that variances between the order value and the invoice value can be determined and forwarded to the cost object and profitability analysis.

(2) Message Choreography

FIG. 416 depicts the message choreography for an exemplary invoice accounting notification process. The receipt or sending of an invoice is posted accordingly in Accounting. The information required is transmitted by Invoicing/Billing 41602 using an InvoiceAccountingNotification message 41606 to Accounting 41604. The invoice can be reversed, even if this could be problematic from a process view (for example, if payment has already been received). With an InvoiceAccountingCancellationRequest message 41608, in the case of an invoice reversal, Accounting 41604 can request a complete cancellation of a previously sent InvoiceAccountingNotification message 41606.

(3) Message Data Type Invoice Accounting Message

FIG. 417 shows a data model for the Invoice Accounting Notification. The message data type InvoiceAccountingMessage includes the InvoiceAccountingMessage Package 41700 included in the business document and the business information that is relevant for sending a business document in a message. The InvoiceAccountingMessage package 41700 includes a MessageHeader package 41702, an InvoiceAccounting package 41704 and an InvoiceAccountingMessage entity 41706. The message data type InvoiceAccountingMessage provides the structure for the message types InvoiceAccountingNotification and the relevant interfaces.

(a) Message Header Package

The MessageHeader package 41702 groups the business information that is relevant for sending a business document in a message. The MessageHeader 41702 is not required for InvoiceAccountingMessage. An invoice or credit memo is transferred to Accounting 41741704 once. A message ID is not required, since the reference can always be established with the ID of the invoice or credit memo. At most, the sender is known as the "system ID." The recipient is not known. Invoicing and Billing 41741702 only know that this message is to be sent to the Accounting 41741704 application.

(b) Invoice Accounting Package

The InvoiceAccounting package 41704 summarizes all the invoice or credit memo information relevant for Accounting. The InvoiceAccounting package 41704 includes a Party Package 41708, a BusinessTransactionDocumentReference Package 41710, an Item Package 41712 and an InvoiceAccounting entity 41714. There is a 1:1 relationship 41716 between the InvoiceAccountingMessage entity 41706 and the InvoiceAccounting entity 41714.

InvoiceAccounting is the preparation of an invoice or credit memo for Accounting. For an invoice or credit memo uniquely identified as the underlying business document, the InvoiceAccounting includes item information about receivables and payables, taxes on sales and purchases, and expenses and revenues. In addition, the business partners involved are named. In addition, the business partners involved are named.

The InvoiceAccounting entity 41714 includes an ID, a TypeCode, a Date, and a PostingDate. The ID is the Identification of the invoice or credit memo, and is of type GDT: BusinessTransactionDocumentID. The TypeCode is the type of invoice or credit memo. These are "I01 VendorInvoice" for an incoming invoice or credit memo, and "I02 Invoice" for an outgoing invoice or credit memo. The differentiation between invoice and credit memo is only relevant at item level for Accounting. The TypeCode is of type GDT: BusinessTransactionDocumentTypeCode. The Date is the invoice date, and is of type GDT: Date. The PostingDate is the date for which the invoice or vendor invoice is relevant for Accounting. This element is optional and only has to be filled if this date is different to the invoice date. The PostingDate is of type GDT: Date.

(c) Party Package

The Party package 41708 groups together the information relevant to business partners affected by the invoice or vendor invoice. It includes a DebtorParty entity 41718 and a CreditorParty entity 41720. There is a 1:1 relationship 41722 between the InvoiceAccounting entity 41714 and the DebtorParty entity 41718. There is a 1:1 relationship 41724 between the InvoiceAccounting entity 41714 and the CreditorParty entity 41720.

(i) Debtor Party

The DebtorParty entity 41718 (customer, debtor) is the owner of payables. The DebtorParty entity 41718 is of type GDT: BusinessTransactionDocumentParty, but only includes the InternalID element. No other elements are required since the master data exists in the sender and receiver system to be able to operate correctly. The DebtorParty entity 41718 is always filled.

For an vendor invoice or credit memo, the buying company (OrderingParty) is mapped in this business partner role. For an invoice or credit memo, the sold-to party is mapped in this business partner role.

(ii) Creditor Party

The CreditorParty entity 41720 (vendor, creditor) is the owner of the receivables. The CreditorParty entity 41720 is of type GDT: BusinessTransactionDocumentParty, but only includes the InternalID element. No other elements are required since the master data exists in the sender and receiver system to be able to operate correctly. CreditorParty is always filled.

For an vendor invoice or credit memo, the vendor is mapped in this business partner role. For an invoice or credit memo, the own billing unit is mapped in this business partner role.

(d) Business Transaction Document Reference Package

The BusinessTransactionDocumentReferencePackage 41710 is the groups together information relevent to references to the underlying business documents for the invoice or vendor invoice that are relevant for all InvoiceAccountingItems. The BusinessTransactionDocumentReferencePackage 41710 includes an OriginInvoiceReference entity 41726 and an OriginVendorInvoiceReference entity 41728. There is a 1:c relationship 41730 between the InvoiceAccounting entity 41714 and the OriginInvoiceReference entity 41726. There is a 1:c relationship 41732 between the InvoiceAccounting entity 41714 and the OriginVendorInvoiceReference entity 41728.

(i) Origin Invoice Reference

The OriginInvoiceReference 41726 is the reference to a previous invoice to the DebtorParty entity 41718, and for which the current invoice or credit memo is a follow-on document. The OriginInvoiceReference entity 41726 is of type GDT: BusinessTransactionDocumentReference, but only includes the Element ID. The ItemID element is not required since reference is made to the document and not to an item. The OriginInvoiceReference entity 41726 is only filled if the current invoice or credit memo is a follow-on document for a previous invoice or credit memo. An OriginInvoiceReference 41726 may be the original invoice number of a current credit memo.

(ii) Origin Vendor Invoice Reference

The OriginVendorInvoiceReference 41728 is the reference to a previous vendor invoice for which the current invoice or credit memo is a follow-on document. The OriginVendorInvoiceReference 41728 is of type GDT: BusinessTransactionDocumentReference, but only includes the Element ID. The ItemID element is not required since reference is made to the document and not to an item. The OriginVendorInvoiceReference 41728 is only filled if the current invoice or credit memo is a follow-on document for an vendor invoice or credit memo. An OriginVendorInvoiceReference may be the original invoice number of a current credit memo.

(e) Invoice Accounting Item Package

The InvoiceAccountingItem package 41712 includes the information required for creating the line items of the accounting document. These are receivables or payments from deliveries and services (DueItem), receivables and payables from taxes (TaxItem), and expenses or revenues (ExpenseRevenueItem). The InvoiceAccountingItem package 41712 includes a DueItem Package 41734, a TaxItem Package 41736, and an ExpenseRevenueItem Package 41738.

The Item package 41712 belong to an invoice that may consist of several items. The total of all Items always balances to zero.

(f) Due Item Package

The DueItem package 41734 is the summary of all accounts receivable or payable from deliveries and services that are listed in an invoice or credit memo item. It includes a DueItem entity 41740. There is a 1:n relationship 41742 between the InvoiceAccounting entity 41714 and the DueItem entity 41740.

The DueItem entity 41740 is the information relevant for Accounting about receivables or payments from deliveries and services that are listed in an invoice or credit memo item. The DueItem entity 41740 includes an Amount, which is the invoice amount in transaction currency. Vendor invoices and credit memos (document type "I01 VendorInvoice") are treated as payables, in other words a positive amount means increased payables and a negative amount means decreased payables. Invoices and credit memos (document type "I02 Invoice") are treated as receivables, in other words a positive amount means increased receivables and a negative amount means decreased receivables. The DueItem entity 41740 is of type GDT: Amount.

There is usually exactly one DueItem entity 41740 that includes the total amount of the receivable or payable. In certain cases, several DueItem entities 41740 may be transferred (Example, Retail: Vendor invoice for drinks also includes a credit memo item for empties).

(g) Tax Item Package

The TaxItem package 41736 is the summary of all receivables or payments from taxes on sales and purchases that are listed in an invoice or credit memo item. The TaxItem package 41736 includes a TaxItem entity 41744. There is a 1:cn relationship 41741746 between the InvoiceAccounting entity 41714 and the TaxItem entity 41744.

The TaxItem entity 41744 is the information relevant for Accounting about an account receivable or payable from taxes on sales and purchases that are listed in an invoice or credit memo item.

The TaxItem entity 41744 includes an Amount and a ProductTaxEventTypeCode. The Amount is the tax amount in transaction currency. Vendor invoices and credit memos (document type "I01 VendorInvoice") are receivables from the tax authorities, in other words, a positive amount means increased receivables and a negative amount means decreased receivables. Invoices and credit memos (document type "I02 Invoice") are payables to the tax authorities, in other words, a positive amount means increased payables and a negative amount means decreased payables. The TaxItem entity 41744 is of type GDT: Amount. ProductTaxEventTypeCode is the taxable income that characterizes the circumstances of the purchase, sale, or consumption of a product, and is of type GDT: ProductTaxEventTypeCode.

There does not have to be a TaxItem entity 41744, for example, if the business transaction is not tax-relevant. However, there can be several TaxItem entities 41744 if several types of tax on sales and purchases or several tax rates are determined (example: Sales tax in USA).

(h) Expense Revenue Item Package

The ExpenseRevenueItem package 41738 is the summary of all expenses or revenues that are listed in an invoice or credit memo item. It includes an ExpenseRevenueItem entity 41754, an ExpenseRevenueItemProductInformation Package 41748, an ExpenseRevenueItemBusinessTransactionDocumentReference Package 41750, and an ExpenseRevenueItemAccountAssignment Package 41752. There is a 1:n relationship 41756 between the InvoiceAccounting entity 41714 and the ExpenseRevenueItem entity 41754.

(i) Expense Revenue Item

The ExpenseRevenueItem entity 41754 is the information relevant for Accounting about an expense or revenue that was listed in an invoice or credit memo item. The ExpenseRevenueItem entity 41754 includes an Amount, a PriceComponentTypeCode, and a Quantity. The Amount is the amount in transaction currency. Vendor invoices and credit memos (document type "I01 VendorInvoice") are an expense, in other words, a positive amount means increased expenses and a negative amount means decreased expenses. Invoices and credit memos (document type "I02 Invoice") are revenue, in other words, a positive amount means increased revenues and a negative amount means decreased revenues. The ExpenseRevenueItem entity 41754 is of type GDT: Amount. The PriceComponentTypeCode is the type of amount: Basic price, freight costs, discount, and is of type GDT: PriceComponentTypeCode. The Quantity is the quantity ordered or sold, and is of type GDT: Quantity.

There is at least one ExpenseRevenueItem entity 41754. If the invoice includes several items with different materials (products) several Items are created. If the revenues or expenses are split further (example: Discount, freight, and so on), several Items are transferred.

(ii) Expense Revenue Item Product Information Package

The ExpenseRevenueItemProductInformation package 41748 is the summary of all Accounting-relevant information from the item concerned about the project. It includes a Product entity 41758. There is a 1:c relationship between the ExpenseRevenueItem entity 41754 and the Product entity 41758.

The Product entity 41758 identifies the goods or service that the invoice item refers to. Product entity 41758 is of type GDT: BusinessTransactionDocumentProduct, but only includes the InternalID element. No other elements are required since the master data exists in the sender and receiver system to be able to operate correctly.

(iii) Expense Revenue Item Business Transaction Document Reference Package

The ExpenseRevenueItemBusinessTransactionDocumentReference package 41750 is the summary of all references to business documents that substantiate the invoice or vendor invoice from the invoice item. The ExpenseRevenueItemBusinessTransactionDocumentReference package 41750 includes a PurchaseOrderReference entity 41762 and a SalesOrderReference entity 41764. There is a 1:c relationship 41766 between the ExpenseRevenueItem entity 41754 and the PurchaseOrderReference entity 41762. There is a 1:c relationship 41768 between the ExpenseRevenueItem entity 41754 and the SalesOrderReference entity 41764.

(a) Purchase Order Reference

The PurchaseOrderReference entity 41762 is the referenced order item in the invoice item. The PurchaseOrderReference entity 41762 is of type GDT: BusinessTransactionDocumentReference. In the GR/IR account, the PurchaseOrderReference entity 41762 is used to assign the vendor invoice to the goods receipt.

(b) Sales Order Reference

The SalesOrderReference entity 41764 is the referenced sales order item in the invoice item. SalesOrderReference entity 41764 is of type GDT: BusinessTransactionDocumentReference. In the goods issue/invoice issue account, the SalesOrderReference entity 41764 is used to assign the invoice to the goods issue.

(iv) Expense Revenue Item Accounting Object Set Package

The ExpenseRevenueItemAccountingObjectSet package 41752 is the summary of all account assignment information for the invoice item. It includes an AccountingObjectSet entity 41770. There is a 1:c relationship 41772 between the ExpenseRevenueItem 41754 and the AccountingObjectSet entity 41770.

Expenses or revenues from an invoice can be mapped with several different account assignments. For example, expenses for freight could be mapped to two different cost centers, 50% to each. However, the sending applications have to make this split; only one account assignment can be specified for each ExpenseRevenueItem.

The AccountingObjectSet entity 41770 includes the account assignment objects to which the expenses or revenues of the invoice item are assigned. The AccountingObjectSet entity 41770 is of type GDT: AccountingObjectSet.

(4) Message Data Type Element Structure

FIG. 418 depicts the element structure for InvoiceAccountingNotification. The element structure identifies the different packages 41800 in the interface, and represents the entities at various levels within the interface. As shown in FIG. 418, the interface for InvoiceAccountingNotification includes six levels 41802, 41804, 41806, 41808, 41810, and 41812. The element structure identifies the number of occurrences 41814 of each element and provides a data type 41816 and a data type name 41818 for each element.

The outermost package of this interface is InvoiceAccountingMessage package 41820, which includes a InvoiceAccountingMessage entity 41822 at the first level 41802. The InvoiceAccountingMessage entity 41822 is of data type MDT 41824 named InvoiceAccountingMessage 41825.

The InvoiceAccountingMessage package 41820 includes a InvoiceAccounting package 41826. The InvoiceAccounting package 41826 includes a Party package 41868, a BusinessTransactionDocumentReference package 41870, an Item package 41872, and an InvoiceAccounting entity 41828 at the second level 41804. The InvoiceAccounting entity 41828 has one occurrence 41830 and is of data type AGDT 41832 named MessageHeader 41834. The Invoice Accounting entity 41828 includes an ID 41836, a TypeCode 41844, a Date 41852, and a PostingDate 41860 at the third level 41806. The ID 41836 has one occurrence 41838 and is of data type BGDT 41840 with a data type name of BusinessTransactionDocumentID 41842. The TypeCode 41844 has one occurrence 41846 and is of a data type of BGDT 41848 with a data type name of BusinessTransactionDocumentTypeCode 41850. The Date 41852 has one occurrence 41854 and is of data type BGDT 41856 with a data type name of Date 41858. The PostingDate 41860 has zero or one occurrence and is of data type BGDT 41864 with a data type name of Date 41866.

The Party package 41868 includes a Debtor Party entity 41874 and a CreditorParty entity 41890 at the third level 41806. The DebtorParty entity 41874 includes an InternalID 41882 at the fourth level 41808. The DebtorParty entity 41874 has one occurrence 41876, and is of data type 418AGDT 41878 with a data type name of BusinessTransactionDocumentParty 41880. The InternalID 41882 has one occurrence 41884 and a data type of BGDT 41886 with a data type name of PartyID 41888. The CreditorParty entity 41890 also includes an InternalID 41892 at the fourth level 41808. The CreditorParty 41890 has one occurrence 41892 and is of data type AGDT 41894 with a data type name of BusinessTransactionDocumentParty 41896. The InternalID 41898 has one occurrence 41800A with a data type of BGDT 41802A and a data type name PartyID 41804A.

The BusinessTransactionDocumentReference package 41870 includes an OriginInvoiceReference entity 41806A and an OriginVendorInvoiceReference entity 41822A at the third level 41806. The OriginInvoiceReference entity 41806A includes an ID 41814A at the fourth level 41808. The OriginVendorInvoiceReference entity 41822A includes an ID 41830A at the fourth level 41808. The OriginInvoiceReference 41806A has zero or one occurrences 41808A and is of a data type AGDT 41810A with a data type name of BusinessTransactionDocumentReference 41812A. The ID 41814A has one occurrence 41816A and is of data type BGDT 41818A with a data type name of BusinessTransactionDocumentID 41820A. The OriginVendorInvoiceReference 41822A has zero or one occurrence 41824A and is of data type AGDT 41826A with a data type name of BusinessTransactionDocumentReference 41828A. The ID 41830A has one occurrence 41832A and is of data type BGDT 41834A with a data type name of BusinessTransactionDocumentID 41836A.

The Item package 41872 includes a DueItem package 41840A, a TaxItem package 41842A, an ExpenseRevenueItem 41844A, and an Item entity 41838A at the third level 41806. The DueItem package 41840A includes a DueItem entity 41846A at the fourth level 41808. The DueItem entity 41846A includes an Amount 41854A at the fifth level 41810. The DueItem 41846A has at least one occurrence 41848A and is of data type AGDT 41850A with a data type name of InvoiceAccountingDueItem 41852A. The Amount 41854A has one occurrence 41856A and is of data type BGDT 41858A with a data type name of Amount 41860A.

The TaxItem package 41842A includes a TaxItem entity 41862A at the fourth level 41808. The TaxItem entity 41862A includes an Amount 41870A and a ProductTaxEventTypeCode 41878A at the fifth level 41810. The TaxItem entity 41862A has any number of occurrences 41864A and is of a data type AGDT 41866A with a data type name of InvoiceAccountingDueItem 41868A. The Amount 41870A has one occurrence 41872A and is of a data type of BGDT 41874A with the data type name of Amount 41876A. The ProductTaxEventTypeCode 41878A has one occurrence 41880A and is of data type BGDT 41882A with a data type name of ProductTaxEventTypeCode 41884A.

The ExpenseRevenueItem 41844A includes a ProductInformation package 41818B, a BusinessTransactionDocumentReference package 41820B, an AccountingObjectSet package 41822B, and an ExpenseRevenueItem entity 41886A at the fourth level 41808. The Expense RevenueItem entity 41886A includes an Amount 41894A, a PriceComponentTypeCode 41802B, and a Quantity 41810B at the fifth level 41810. The ExpenseRevenueItem entity 41886A has at least one occurrence 41888A and is of data type AGDT 41890A with a data type name of InvoiceAccountingExpenseRevenueItem 41892A. The Amount 41894A has one occurrence 41896A and is of data type BGDT 41898A with a data type name of Amount 41800B. The PriceComponentTypeCode 41802B has one occurrence 41804B and is of data type BGDT 41806B with a data type name of PriceComponentTypeCode 41808B. The Quantity 41810B has zero or one occurrences 41812B and is of data type BGDT 41814B with a data type name of Quantity 41816B.

The ProductInformation package 41818B includes a Product entity 41824B at the fifth level 41810. The Product entity 41824B includes an InternalID 41832 at the sixth level 41812, which has one occurrence 41834B and is of data type BGDT 41836B with a data type name of ProductID 41838B. The Product entity 41824B has zero or one occurrences 41826B and is of data type BGDT 41828B with a data type name of BusinessTransactionDocumentProduct 41830B.

The BusinessTransactionDocumentReference package 41820B includes a PurchaseOrderReference entity 41840B and a SalesOrderReference 41848B at the fifth level 41810. The PurchaseOrderReference entity 41840B has zero or one occurrences 41842B and is of data type AGDT 41844B with a data type name of BusinessTransactionDocumentReference 41846B. The SalesOrderReference 41848B has zero or one occurrences 41850B and is of data type AGDT 41852B with a data type name of BusinessTransactionDocumentReference 41854B.

The AccountingObjectSet package 41822B includes an AccountingObjectSet entity 41856B at the fifth level 41810. The AccountingObjectSet entity 41856B has zero or one occurrences 41858B and is of data type AGDT 41860B with a data type name of AccountingObjectSet 41862B.

s) Delivery Execution Request

FIG. 419 depicts a graphical representation 41900 of a DeliveryExecutionRequest 41912 between business entities in accordance with methods and systems consistent with the present invention. The illustrative message choreography is a logical sequence of messages that is not dependent on actual scenarios. In the implementation shown in FIG. 419, the illustrative business entities include an Ordering Application 41902, a Fulfillment Coordination 41904, and a Supply Chain Execution 41906. The request to supply chain execution to carry out an action, or to make preparations to do so, can be made in the form of a DeliveryExecutionRequest 41912 via Fulfillment Coordination or directly from the order entry system or purchase order system. Deliveries to be executed or expected deliveries are created or adapted from a DeliveryExecutionRequest 41912. Interested applications are informed by DeliveryInformation 41914 that deliveries to be executed or expected deliveries have been created or changed.

Fulfillment Coordination 41904 is optional in this message choreography. Corresponding messages from the sales order system (such as SalesOrderFulfillmentRequest 41908 from CRM) can be mapped to the DeliveryRequest.

In a DeliveryExecutionRequest 41912, items and schedule lines may be transmitted with complete data at object level, i.e., if an item or a schedule line is transmitted, all data specified in the interface for the item or schedule line must be transmitted.

In a DeliveryExecutionRequest 41912, the ActionCode may be used at header level and at item level in order to display whether the DeliveryExecutionRequest 41912 or individual items are to be created, changed, or deleted. It is checked against the transmitted ActionCode. The CompleteTransmissionIndicator controls whether all items were transmitted or only explicitly changed items. If the CompleteTransmissionIndicator is set, the ActionCode may be set to "Create." In this case, items not transmitted may be implicitly deleted.

A DeliveryExecutionConfirmation or a DeliveryExecutionFulfillmentNotification 41910 can be sent in order to inform the requesting system that a DeliveryExecutionRequest cannot be executed, cannot be executed in full, or that an incoming change cannot be accepted and executed. It may be sufficient to transmit the details about the delivery using the DeliveryInformation 41914, since the requesting system can decide itself, by means of completion rules or partial delivery agreements, whether a retrospective change is still being processed or has been processed.

Motivating business scenarios for the DeliveryExecutionRequest interface include "Sell From Stock" and "Procure To Stock." In the "Sell from Stock" scenario, purchase orders are accepted from the customer and generate a request to Logistics to fulfill the order. In this scenario, the order is fulfilled by delivering the ordered goods to the customer from a goods warehouse. A delivery request to the relevant goods warehouse is generated, which results in a delivery to be executed at a specific time. In the "ProcureToStock" scenario, goods are ordered from a vendor. The purchase order or confirmation of the purchase order by the vendor generates a request to Logistics to receive the goods on the requested or confirmed date and place them in storage. The vendor sends an advanced shipping notification, which specifies further details regarding quantities and dates for the request to the warehouse.

A DeliveryExecutionRequest is a request to a warehouse or to supply chain execution to prepare and execute the outbound delivery of goods or the receipt of a expected or announced inbound goods delivery. The structure of the message type DeliveryExecutionRequest is specified in the message data type DeliveryExecutionRequestMessage.

In the case of outbound deliveries (sales orders or purchase order returns to a vendor), this message type represents a request to stage goods and execute a delivery of particular products to a customer or a vendor for a particular point in time. In the case of inbound deliveries (purchase orders to a vendor or returns by a customer), this message type represents a request to prepare for goods receipt at a particular date and to accept and receive the goods. In the following relevant passages, the term "delivery" refers to outbound as well as inbound deliveries, i.e., the direction in which the goods flow is irrelevant for the basic document, but it is controlled from the context of the message by an indicator.

The message choreography describes the possible logical sequence in which different types of messages can appear. This choreography is independent of the actual process or scenario.

The request to supply chain execution to carry out an action, or make preparations to do so can be made in the form of a DeliveryExecutionRequest by Fulfillment Coordination or directly from the order entry system or purchase order system. Deliveries to be executed or expected deliveries are created or adapted from a DeliveryExecutionRequest. The interested applications are informed by DeliveryInformation that deliveries to be executed or expected deliveries have been created or changed. The corresponding messages from the sales order system (such as SalesOrderFulfillmentRequest from CRM) can be mapped to the DeliveryRequest.

In one implementation, in a DeliveryExecutionRequest, items and schedule lines are transferred with complete data at object level, i.e., if an item or a schedule line is transferred, the data specified in the interface for the item or schedule line has to be transferred. In a DeliveryExecutionRequest, the ActionCode is used at header and item level in order to display whether the DeliveryExecutionRequest or individual items are to be created, changed, or deleted. It is checked against the transferred ActionCode. The CompleteTransmissionIndicator controls whether items were transferred or explicitly changed items. If the CompleteTransmissionIndicator is set, the ActionCode by definition has to be set to “Create.” In this case, items not transferred are implicitly deleted.

In order to inform the requesting system that a DeliveryExecutionRequest cannot be executed, cannot be executed in full, or that an incoming change cannot be accepted and executed, a DeliveryExecutionConfirmation or a DeliveryExecutionFulfillmentNotification can be sent. Initially, it is sufficient to transfer the details about the delivery using the DeliveryInfo, since the requesting system can decide itself by means of completion rules or partial delivery arrangements if a retrospective change is still being processed or has been processed.

(1) Message Data Type Delivery Execution Request Message

The message data type DeliveryExecutionRequestMessage is included in a Delivery Execution Request Message package 42000 depicted in FIGS. 420A-L. The Delivery Execution Request Message package 42000 includes a DeliveryExecutionRequestMessage entity 42006, which is included in the business document and the business information that is relevant for sending a business document in a message. The message data type DeliveryExecutionRequestMessage includes a MessageHeader package 42002 and a DeliveryExecutionRequest package 42004. The message data type DeliveryExecutionRequestMessage makes the structure available for the message type DeliveryExecutionRequest and the relevant interfaces.

(a) Message Header Package

A MessageHeader package 42002 groups together the business information that is relevant for sending a business document in a message. The MessageHeader groups together the business information from the point of view of the sending application to identify the business document in a message, to provide information about the sender, and to provide any information about the recipient.

The MessageHeader entity is divided into a SenderParty entity and a RecipientParty entity, and is of type GDT: BusinessDocumentMessageHeaderParty. The MessageHeader includes an ID and a CreationDateTime. The ID is the identification of the business document in the technical message. The CreationDateTime is the creation date of a business document in the technical message. A MessageHeader is not required.

(b) Delivery Execution Request Package

The DeliveryExecutionRequest package 42004 groups together data for creating an outbound or inbound delivery. It includes a Party package 42008, a Location package 42010, a DeliveryInformation package 42012, a FollowUpMessage package 42014, an Attachment package 42016, a Description package 42018, and an Item package 42020. The DeliveryExecutionRequest package 42004 also includes a DeliveryExecutionRequest entity 42022. There is a 1:n relationship 42024 between the DeliveryExecutionRequestMessage 42006 and the DeliveryExecutionRequest entity 42022.

The DeliveryExecutionRequest entity 42022 is a request to supply chain execution (e.g., Logistics or the warehouse) to stage goods and to deliver them or prepare goods arrivals and receive incoming goods. The requests to supply chain execution can be derived from sales orders or customer returns, purchase orders or returns to vendors, service orders or the need to stage raw materials, semifinished and finished products for production. A DeliveryExecutionRequest entity 42022 operation includes request items with the requested products, partners, locations, and schedule lines. This specifies when and where, and by whom products are to be staged and delivered (from and to) and received.

The DeliveryExecutionRequest entity 42022 includes a BaseBusinessTransactionDocumentID, a BaseBusinessTransactionDocumentTypeCode, an ActionCode, a CreationDateTime, a LastChangeDateTime, and an ItemListCompleteTransmissionIndicator. The BaseBusinessTransactionDocumentID is an identifier of the base business document for the DeliveryExecutionRequest, and is of type GDT: BusinessTransactionDocumentID. The BaseBusinessTransactionDocumentTypeCode is a coded representation of the previously identified business document type, such as PurchaseOrder and SalesOrder, and is of type GDT: BusinessTransactionDocumentTypeCode. The ActionCode is a coded representation of the actions that control creating, changing, and deleting the requesting document at a message recipient, and is of type GDT: ActionCode. The CreationDateTime is the calendar day and time on which the document was created, and is of type GDT: DateTime. The LastChangeDateTime is the calendar day and time on which the document was changed, and is of type GDT: DateTime. The ItemListCompleteTransmissionIndicator is the ItemListCompleteTransmissionIndicator specifies whether the items in the document are to be transmitted (items that are not transmitted are implicitly classed as cancelled) or whether new, changed items that have been cancelled since the last transmission are to be transmitted, and is of type GDT: CompleteTransmissionIndicator. “Create,” “Change,” and “Delete” are permitted as ActionCodes.

(i) Party Package

The Party package 42008 groups together the business partners that can be involved in a business delivery process. It includes a BuyerParty entity 42026, a SellerParty entity 42028, a ProductRecipientParty entity 42030, a VendorParty entity 42032, and a CarrierParty entity 42034. A default logic is used from the header to the items for business partners. Business partners specified at the header level are used for the items for which a corresponding partner is not explicitly transferred. The default logic is used for the partner as a whole, including the contact persons. In one implementation, parts of a partner specified at header level cannot be specified in more detail at item level. The default logic is a simplified version of the transferred message. As regards logic, partners at header level behave as if they have been explicitly transferred for the items of the message. Changes to partners at header level are changes to the items for which these partners are valid.

In one implementation, either the ID or the ID and address can be transferred for each partner. If the ID is transferred, the address defined in the master data is used. If the ID and address are transferred, the ID identifies the partner and the address is deemed to be a document address that is different than the master data address.

The BuyerParty entity 42026 is the buying company or person. The BuyerParty entity 42026 is of type GDT: BusinessTransactionDocumentParty. Initially, the internal ID serves as identification, i.e., the InternalID has to and can be transferred. The BuyerParty entity 42026 includes an Address entity 42046 and a Contact entity 42048. There is a 1:c relationship 42050 between the BuyerParty entity 42026 and the Address entity 42046. There is also a 1:c relationship 42052 between the BuyerParty entity 42026 and the Contact entity 42048.

The Address entity 42046 includes a PersonName entity 42054, an Office entity 42056, a PhysicalAddress entity 42058, a GeoCoordinates entity 42060, and a Communication entity 42062. There is a 1:c relationship 42064 between the Address entity 42046 and the PersonName entity 42054. There is a 1:c relationship 42066 between the Address entity 42046 and the Office entity 42056. There is a 1:c relationship 42068 between the Address entity 42046 and the PhysicalAddress entity 42058. There is a 1:c relationship 42070 between the Address entity 42046 and the GeoCoordinates entity 42062. There is a 1:c relationship 42072 between the Address entity 42046 and the Communication entity 42062.

The Contact entity 42048 includes an Address entity 42074. There is a 1:c relationship 42076 between the Contact entity 42048 and the Address entity 42074. The Address entity 42074 in the Contact entity 42048 includes the same elements as the Address entity 42046 in the BuyerParty entity 42026. For example, Address entity 42074 includes a PersonName entity 42078, an Office entity 42080, a PhysicalAddress entity 42082, a GeoCoordinates entity 42084, and a Communication entity 42086. There is a 1:c relationship 42088 between the Address entity 42074 and the PersonName entity 42078. There is a 1:c relationship 42090 between the Address entity 42074 and the Office entity 42080. There is a 1:c relationship 42092 between the Address entity 42074 and the PhysicalAddress entity 42082. There is a 1:c relationship 42094 between the Address entity 42074 and the GeoCoordinates entity 42084. There is a 1:c relationship 42096 between the Address entity 42074 and the Communication entity 42086.

The SellerParty entity 42028 is the selling company. The SellerParty entity 42028 is of type GDT: BusinessTransactionDocumentParty. Initially, the internal ID serves as identification, i.e., the InternalID can be transferred. The SellerParty entity 42028 includes the same elements 42098 as the BuyerParty entity 42026.

The ProductRecipientParty 42030 is the company or person to which goods are to be delivered. The ProductRecipientParty entity 42030 is of type GDT: BusinessTransactionDocumentDocumentParty. In a delivery process in supply chain execution, the ShipToLocation is used as the delivery address rather than the address of the ProductRecipientParty entity 42030. Initially, the internal ID serves as identification, i.e., the InternalID can be transferred. In one implementation, one part of the ProductRecipientParty entity 42030 in the delivery process, however, is the specified contact person for any queries relating to a delivery. The ProductRecipientParty entity 42030 includes the same elements 42000A as the BuyerParty entity 42026.

The VendorParty entity 42032 is the company or person who is to deliver goods. The VendorParty entity 42032 is of type GDT: BusinessTransactionDocumentParty. In a delivery process in supply chain execution, the ShipFromLocation is used as the delivery address rather than the address of the VendorParty entity 42032. Initially, the internal ID serves as identification, i.e., the InternalID can be transferred. In one implementation, one part of the VendorParty entity 42032 in the delivery process, however, is the specified contact person for any queries relating to a delivery. The VendorParty entity 42032 includes the same elements 42002A as the BuyerParty entity 42026.

The CarrierParty entity 42034 is the company or person that transports the goods. The CarrierParty entity 42034 is of type GDT: BusinessTransactionDocumentParty. Initially, the internal ID serves as identification, i.e., the InternalID can be transferred. The CarrierParty entity 42034 includes the same elements 42004A as the BuyerParty entity 42026.

(ii) Location Package

The Location package 42010 groups together the locations that can occur in a delivery process. It includes a ShipToLocation entity 42006A and a ShipFromLocation entity 42008A. There is a 1:c relationship 42010A between the DeliveryExecutionRequest entity and the ShipToLocation entity 42006A. Similarly, there is a 1:c relationship 42012A between the DeliveryExecutionRequest entity 42022 and the ShipFromLocation entity 42008A.

In one implementation, the Location package 42010 transfers either the ID, the address, or both the ID and address for each location. If the ID is transferred, the system uses the address defined in the master data. If the address is transferred, the system uses this address (a location may be assigned at the address recipient). If the ID and address are transferred, the ID identifies the location and the address is deemed to be a document address that is different than the master data address.

The ShipToLocation entity 42006A and the ShipFromLocation entity 42008A can be used to provide a detailed description of the flow of goods between the ship-to and ship-from location. A default logic is used for locations from the header to the items. Locations specified at header level are valid for the items for which a corresponding location is not explicitly transferred. The default logic applies for the location as a whole, including the contact persons. In one implementation, parts of a location specified at header level are not specified more precisely at the item level. The default logic is a simplified version of the transferred message. Locations at the header level act as if they have been explicitly transferred for of the items of the message. Changes to the locations at the header level are changes to the items that are valid for this location.

The ShipToLocation entity 42006A is the location to which goods are shipped. The ShipToLocation entity 42006 is of type GDT: BusinessTransactionDocumentLocation. The ShipToLocation entity 42006A is the delivery address. If the ShipToLocation entity 42006A is not specified in the header of the Order package, it is specified at item level in the Item package 42020 and vice versa. Initially, the internal ID serves as identification, i.e., the InternalID can be transferred. The ShipToLocation entity includes an Address entity. There is a 1:c relationship 42016A between the ShipToLocation entity 42006A and the Address entity 42014A. The Address entity 42014A includes a PersonName entity 42018A, an Office entity 42020A, a PhysicalAddress entity 42022A, a GeoCoordinates entity 42024A and a Communication entity 42026A. There is a 1:c relationship 42028A between the Address entity 42014A and the PersonName entity 42018A. There is a 1:c relationship between the Address entity 42014A and the Office entity. There is a 1:c relationship 42032A between the Address entity 42014A and the PhysicalAddress entity 42022A. There is a 1:c relationship 42034A between the Address entity 42014A and the GeoCoordinates entity 42024A. There is a 1:c relationship 42036A between the Address entity 42014A and the Communication entity 42026A.

The ShipFromLocation entity 42008A is the location from which goods are shipped. The ShipFromLocation entity 42008A is of type GDT: BusinessTransactionDocumentLocation. Initially, the internal ID serves as identification, i.e., the InternalID can be transferred. The ShipFromLocation entity 42008A includes the same elements 42038A as the ShipToLocation entity 42006A.

(iii) Delivery Information Package

The DeliveryInformation package 42012 groups together controlling delivery parameters for one or more requested or announced deliveries in a delivery process. It includes a DeliveryTerms entity 42040A and a DeliveryControl entity 42042A. There is a 1:c relationship 42044A between the DeliveryExecutionRequest entity 42022 and the DeliveryTerms entity 42040A. There is a 1:c relationship 42046A between the DeliveryExecutionRequest entity and the DeliveryControl entity 42042A.

The DeliveryTerms entity 42040A is the conditions and agreements that are to be valid for executing the delivery and transporting the ordered goods and for the desired services and activities. The DeliveryTerms entity 42040 Ais of type GDT: DeliveryTerms. DeliveryTerms entity 42040A uses the default logic from the header to the items. Thus, items for which a deviating DeliveryTerm entity 42040A is not explicitly transferred use the DeliveryTerms entity 42040A specified at header level. The default logic is a simplified version of the transferred message. As regards logic, DeliveryTerms entity 42040A at the header level behave as if they have been explicitly transferred for the items of the message. Changes to DeliveryTerms entity 42040A at header level are changes to the items for which these DeliveryTerms entity 42040A are valid.

The DeliveryTerms entity 42040A includes an Incoterms entity 42048A, a PartialDelivery entity 42050A, a QuantityTolerance entity, 42052A a Transport entity 42054A, and a Description entity 42056A. There is a 1:c relationship 42058A between the DeliveryTerms entity 42040A and the Incoterms entity. There is a 1:c relationship 42060A between the DeliveryTerms entity 42040A and the PartialDelivery entity 42050A. There is a 1:c relationship 42064A between the DeliveryTerms entity 42040A and the QuantityTolerance entity 42052A. There is a 1:c relationship 42066A between the DeliveryTerms entity 42040A and the Transport entity 42054A. There is a 1:c relationship 42066A between the DeliveryTerms entity 42040A and the Description entity 42056A.

The DeliveryControl entity 42042A is the set of internal controlling delivery parameters for one or more requested deliveries in a delivery process. The DeliveryControl entity 42042A is a structuring package and includes a DeliveryBlockedIndicator, which is of type GDT BusinessTransactionBlockedIndicator, and an Indicator that indicates whether the sales order or the sales order item has been blocked for delivery.

DeliveryControl entity 42042A uses the default logic from the header to the items. Thus, items for which a deviating DeliveryControl entity 42042A is not explicitly transferred use the DeliveryControl entity 42042A specified at header level. The default logic is a simplified version of the transferred message. As regards logic, DeliveryControl entity 42042A at header level behaves as if it has been explicitly transferred for the items of the message. Changes to DeliveryControl entity 42042A at header level are changes to the items for which this DeliveryControl entity 42042A is valid. An example of a DeliveryControl entity 42042A is delivery block with blocking reason, such as credit limit check.

(iv) Follow-Up Message Package

The FollowUpMessage package 42014 groups together the information that defines if or which types of follow-up messages are expected during the subsequent process. It includes a FollowUpDespatchedDeliveryNotification entity 42068A, a FollowUpBillingDueNotification entity 42070A, and a FollowUpInvoicingDueNotification entity 42072A. There is a 1:c relationship 42074A between the DeliveryExecutionRequest entity 42022 and the FollowUpDespatchedDeliveryNotification entity 42068A. There is a 1:c relationship 42076A between the DeliveryExecutionRequest entity 42022 and the FollowUpBillingDueNotification entity 42070A. There is a 1:c relationship 42078A between the DeliveryExecutionRequest entity 42022 and the FollowUpInvoicingDueNotification entity 42072A. The fact that a follow-up message is expected does not mean that the requesting partner of the delivery is informed or wants to be informed of this follow-up message.

The FollowUpDespatchedDeliveryNotification entity 42068A is information about how and if the buyer would like to be informed by the seller of a delivery and specifies if a advanced shipping notification (ASN) is expected or is to be sent. The FollowUpDespatchedDeliveryNotification entity 42068A includes a RequirementCode, which is a coded representation of the type or the extent to which a follow-up message is expected, and is of type GDT: FollowUpMessageRequirementCode. The seller can transfer the confirmation of the outbound delivery either electronically using a DespatchedDeliveryNotification message or by traditional methods of communication, such as e-mail or fax. The values “Expected” and “Unexpected” are permitted for the RequirementCode.

The FollowUpBillingNotification entity 42070A is information about whether an invoice is to be created during the subsequent process and whether the delivery data is required for invoice creation. The FollowUpBillingNotification entity 42070A includes a RequirementCode, which is a coded representation of the type or the extent to which a follow-up message is expected, and is of type GDT: FollowUpMessageRequirementCode. The values “Required” and “Forbidden” are permitted for the RequirementCode.

The FollowUpInvoicingNotification entity 42072A is information about whether an invoice is expected during the subsequent process and if the delivery data is desired for invoice verification. The FollowUpInvoicingNotification entity 42072A includes a RequirementCode, which is a coded representation of the type or the extent to which a follow-up message is expected, and is of type GDT: FollowUpMessageRequirementCode. The values “Required” and “Forbidden” are permitted for the RequirementCode.

(v) Attachment Package

The Attachment package 42016 groups together the attachment information regarding the requesting sales order. It includes an AttachmentWebAddress entity 42080A. There is a 1:cn relationship 42082A between the DeliveryExecutionRequest entity 42022 and the AttachmentWebAddress entity 42080A.

The AttachmentWebAddress entity 42080A refers to a web address for a document of any type that is assigned to a DeliveryExecutionRequest entity 42022 as an attachment. The AttachmentWebAddress entity 42080A is of type GDT: WebAddress.

(vi) Description Package

The Description package 42018 groups together the explanatory texts regarding the sales order or the purchase order or the requesting document generally. It includes an InternalDescription entity 42084A and a Description entity 42086A. There is a 1:c relationship 42088A between the DeliveryExecutionRequest entity 42022 and the InternalDescription entity 42084A. There is a 1:c relationship 42090A between the DeliveryExecutionRequest entity 42022 and the Description entity 42086A.

The InternalDescription entity 42084A is a natural-language text regarding the sales order or the purchase order. The InternalDescription entity 42084A is of type GDT: Description. The InternalDescription entity 42084A can be used for different types of textual information about the transferred sales order or the transferred purchase order and not just the current message. It is intended for "internal" use and in one implementation, is not visible to external business partners.

A Description entity 42086A is a natural-language text regarding the sales order or the purchase order, which is visible to business partners. The Description entity 42086A is of type GDT: Description. The Description entity 42086A can be used for different types of textual information about the transferred sales order or the transferred purchase order and not just the current message.

(vii) Delivery Execution Request Item Package

The DeliveryExecutionRequestItem package 42020 groups together the data that describes the delivery type, quantity, and circumstances for a product to be delivered or received. It includes a ProductInformation package 42092A, a Batch package 42094A, a Party package 42096A, a Location package 42098A, a DeliveryInformation package 42000B, an Attachment package 42002B, a Description package 42004B, and a ScheduleLine package 42006B. The DeliveryExecutionRequestItem package 42020 also includes a DeliveryExecutionRequestItem entity 42008B. There is a 1:n relationship 42010B between the DeliveryExecutionRequest entity 42022 and the DeliveryExecutionRequestItem entity 42008B. DeliveryExecutionRequestItem entities 42008B are arranged hierarchically using a Hierarchy Relationship entity 42012B. The Hierarchy Relationship entity 42012B is the relationship between a sub-item and a higher-level parent item in an item hierarchy.

DeliveryExecutionRequestItem entity 42008B is the part of a delivery request that includes an actual product, quantities, and dates as well as the location to which the product is to be delivered. The DeliveryExecutionRequestItem entity 42008B includes a BaseBusinessTransactionDocumentItemID, a BaseBusinessTransactionDocumentItemTypeCode, an ActionCode, a CreationDateTime, a LastChangeDateTime, a HierarchyRelationship, and a ScheduleLineListCompleteTransmissionIndicator.

The BaseBusinessTransactionDocumentItemID is an identifier of the item in the base business document for the DeliveryExecutionRequest, and is of type GDT: BusinessTransactionDocumentItemID. The BaseBusinessTransactionDocumentItemTypeCode is a coded representation of the previously identified item, and is of type GDT: BusinessTransactionDocumentItemTypeCode. The ActionCode is a coded representation of the actions that control creating, changing, and deleting the document items at a message recipient, and is of type GDT: ActionCode. The CreationDateTime is the calendar day and time when the item was created, and is of type GDT: DateTime. The LastChangeDateTime is the calendar day and time on which the item was changed, and is of type GDT: DateTime. HierarchyRelationship includes a ParentItemID, which is of type GDT BusinessTransactionDocumentItemID, and a TypeCode, which is of type GDT BTDItemHierarchyRelationshipTypeCode. The ScheduleLineListCompleteTransmissionIndicator specifies whether the schedule lines in the document are to be transmitted (schedule lines that are not transmitted are implicitly classed as cancelled) or whether new, changed schedule lines that have been cancelled since the last transmission are to be transmitted, and is of type GDT: CompleteTransmissionIndicator.

The TypeCode classifies the base document item. From a semantic point of view, items can recursively contain other items. Item hierarchies are mapped in this way. From a technical point of view, the item type is generally not defined recursively, since this may not be handled by some commonly-used XML tools. The hierarchies are mapped using a ParentItemID and an ItemHierarchyTypeCode.

The values "O01" (Sales Order) and "O02" (Purchase Order) are permitted as TypeCodes. The constraints in the GDT BusinessTransactionDocumentItemTypeCode in connection with the DeliveryExecutionRequestTypeCode are applicable here. "Create," "Change," and "Delete" are permitted as ActionCodes, since a hard semantic may initially be required. If the ItemListCompleteTransmissionIndicator is set, the ActionCode has to be set to "Create."

(a) Delivery Execution Request Item Product Information Package

The DeliveryExecutionRequestItemProductInformation package 42092A groups together the information for identifying and describing a product in a purchase requisition item for Logistics. It includes a Product entity 42018B. There is a 1:c relationship 42020B between the DeliveryExecutionRequestItem entity 42008B and the DeliveryExecutionRequestItemProduct entity 42018B.

The Product entity 42018B identifies and describes the product to be delivered or the announced product. The Product entity 42018B is of type GDT: BusinessTransactionDocumentProduct. Initially, the internal ID serves as identification, i.e., the InternalID can be transferred.

(b) Delivery Execution Request Item Batch Package

The DeliveryExecutionRequestItemBatch package 42094A groups together the batch information for the product ordered in a purchase order item or sales order item. It includes a Batch entity 42022B. There is a 1:c relationship 42024B between the Item entity 42008B and the Batch entity 42022B.

The Batch entity 42022B includes a batch and its properties. A batch is a partial quantity of a particular material and is a homogeneous, non-reproducible unit with particular specifications. The Batch entity 42022B includes a BatchID, which is of type GDT: BatchID.

(c) Delivery Execution Request Item Party Package

The DeliveryExecutionRequestItemParty Package 42096A is similar to the Party package 42008 at the header level. It includes a BuyerParty entity 42026B, a SellerParty entity 42028B, a ProductRecipientParty entity 42030B, a VendorParty entity 42032B, and a CarrierParty entity 42034B. There is a 1:c relationship 42036B, 42038B, 42040B, 42042B and 42044B, respectively between the the DeliveryExecutionRequestItem entity 42008B and these entities. These entities have a 1:c relationship 42046B, 42048B, 42050B, 42052B and 42054B respectively with the corresponding Address entities.

(d) Delivery Execution Request Item Location Package

The Delivery Execution Request Item Location Package is similar to the Location package at the header level. The Location package 42098A includes a ShipToLocation entity 42006A and a ShipFromLocation entity 42008A. There is a 1:c relationship 42060B between the DeliveryExecutionRequestItem entity 42008B and the ShipToLocation entity 42056B. Similarly, there is a 1:c relationship 42060B between the DeliveryExecutionRequestItem entity 42008B and the ShipFromLocation entity 42058B. These entities have a 1:c relationship 42064B, 42066B, respectively with the corresponding Address entities.

(e) Delivery Execution Request Item Delivery Information Package

The Delivery Execution Request Item Delivery Information Package 42000B is similar to the DeliveryInformation package at the header level. It includes a DeliveryTerms entity 42068B and a DeliveryControl entity 42070B. There is a 1:c relationship 42044A between the DeliveryExecutionRequestItem entity 42008B and the DeliveryTerms entity 42040A. There is a 1:c relationship between the DeliveryExecutionRequestItem entity 42008B and the DeliveryControl entity 42070B.

(f) Delivery Execution Request Item Attachment Package

The Delivery Execution Request Item Attachment Package 42096B is similar to the Attachment package at the header level. It includes an AttachmentWebAddress entity 42096B. There is a 1:cn relationship 42002B between the DeliveryExecutionRequestItem entity 42008B and the AttachmentWebAddress entity 42096B.

(g) Delivery Execution Request Item Description Package

The Delivery Execution Request Item Description Package 42004B is similar to the Description package at the header level. It includes an InternalDescription entity 42000C and a Description entity 42002C. There is a 1:c relationship 42004C between the DeliveryExecutionRequestItem entity 42008B and the InternalDescription entity 42000C. There is a 1:c relationship 42006C between the DeliveryExecutionRequestItem entity 42008B and the Description entity 42002C.

(h) Delivery Execution Request Item Schedule Line Package

The DeliveryExecutionRequestItemScheduleLine package 42006B groups together the information about quantities and dates for a purchase requisition item that are relevant for a request to Logistics. It includes a ScheduleLine entity 42008C and a ConfirmedScheduleLine entity 42010C. There is a 1:n relationship 42012C between the Item entity 42008B and the ScheduleLine entity 42008C. There is a 1:n relationship 42014C between the Item entity 42008B and the ConfirmedScheduleLine entity 42010C.

The ScheduleLine entity 42008C is information about the delivery quantities and various dates of the schedule expected by Sales or Purchasing in a DeliveryExecutionRequest entity 42022. The ScheduleLine entity 42008C includes an ID, an ActionCode, a Quantity, and a DeliveryDateTimePeriod. The ID is a key for a schedule line, and is of type GDT ScheduleLineID. The ActionCode is a coded representation of the actions that control creating, changing, and deleting the schedule line at a message recipient, and is of type GDT: ActionCode. The Quantity is the required or expected quantity in the sales or order unit, and is of type GDT: Quantity. The DeliveryDateTimePeriod is the (planned) delivery period: expected or confirmed delivery date/time or delivery period, and is of type GDT: DateTimePeriod. "Create," "Change," and "Delete" are permitted as ActionCodes, since initially a hard semantic may be required. If ActionCodes are used, IDs are specified. If the ScheduleLineListCompleteTransmissionIndicator is set, the ActionCode is set to "Create." The ScheduleLine entity 42008C includes a DeliveryPeriod entity 42016C. There is a 1:c relationship 42018C between the ScheduleLine entity and the DeliveryPeriod entity 42016C.

The ConfirmedScheduleLine entity 42010C is information about the delivery quantities and various dates of the schedule expected by Sales or Purchasing in a DeliveryExecutionRequest entity 42022. The ConfirmedScheduleLine entity 42010C includes a DeliveryPeriod entity 42020C. There is a 1:c relationship 42022C between the ConfirmedScheduleLine entity 42010C and the DeliveryPeriod entity 42020C.

(2) Element Structure

The message data type element structure for the DeliveryExecutionRequest message is depicted in FIG. 421. The element structure is similar to the data model, but provides additional information regarding the details of the interface. The element structure identifies the different packages 42100 in the interface, and represents the entities at various levels within the interface. As depicted in FIG. 421, the interface for DeliveryExecutionRequest includes five levels 42102, 42104, 42106, 42108, and 42110. The outermost package of this interface is a DeliveryExecutionRequestMessage package 42116, which includes a DeliveryExecutionRequestMessage entity 42118 at the first level 42102. The DeliveryExecutionRequestMessage entity 42118 is of a type "DeliveryExecutionRequestMessage" 42120. The DeliveryExecutionRequestMessage package 42116 includes a MessageHeader package 42122 and a DeliveryExecutionRequest package 42124.

The MessageHeader package 42122 includes a MessageHeader entity 42126 at the second level 42104. The MessageHeader entity 42126 is of a type "MessageHeader" 42130, and there is zero or one 42128 MessageHeader entity 42126 for each MessageHeader package 42122.

The DeliveryExecutionRequest package 42124 includes one 42134 DeliveryExecutionRequest entity 42132 at the second level 42104 and the following packages: a Party package 42174, a Location package 42176, a DeliveryInformation package 42178, a FollowUpMessage package 42180, an Attachment package 42182, a Description package 42184, and a DeliveryRequestItem package 42186.

The DeliveryExecutionRequest entity 42132 includes a BaseBusinessTransactionID entity 42138, a BaseBusinessTransactionTypeCode entity 42144, an ActionCode entity 42150, a CreationDateTime entity 42156, a LastChangeDateTime entity 42162, and an ItemListCompleteTransmissionIndicator entity 42168. The BaseBusinessTransactionID entity 42138 is of type "BusinessTransactionDocumentID" 42142, and there is one 42140 BaseBusinessTransactionID entity 42138 for each DeliveryExecutionRequest entity 42132. The BaseBusinessTransactionTypeCode entity 42144 is of type "BusinessTransactionDocumentTypeCode" 42148, and there is one 42146 BaseBusinessTransactionTypeCode 42144 for each DeliveryExecutionRequest entity 42132. The ActionCode entity 42150 is of type "ActionCode" 42154, and there is zero or one 42152 ActionCode 42150 for each DeliveryExecutionRequest entity 42132. The CreationDateTime entity 42156 is of type "DateTime" 42160, and there is zero or one 42158 CreationDateTime entity 42156 for each DeliveryExecutionRequest entity 42132. The LastChangeDateTime entity 42162 is of type "DateTime" 42166, and there is zero or one 42164 LastChangeDateTime entity 42162 for each DeliveryExecutionRequest entity 42132. The ItemListCompleteTransmissionIndicator entity 42168 is of type "CompleteTransmissionIndicator" 42172, and there is zero or one 42170 ItemListCompleteTransmissionIndicator entity 42168 for each DeliveryExecutionRequest entity 42132.

The Party package 42174 includes a BuyerParty entity 42188, a SellerParty entity 42124A, a ProductRecipientParty entity 42132A, a VendorParty entity 42140A, and a CarrierParty entity 42148A at the third level 42106.

The BuyerParty entity 42188 is of the type "BusinessTransactionDocumentParty" 42192, and there is one or zero 42190 BuyerParty entity 42188 for each Party package 42174. The SellerParty entity 42124A is of the type "BusinessTransactionDocumentParty" 42130A, and there is zero or one 42128A SellerParty entity 42124A for each Party package 42174. The ProductRecipientParty entity 42132A is of the type "BusinessTransactionDocumentParty" 42138A, and there is one or zero 42136A ProductRecipientParty entity 42132A for each Party package 42174. The VendorParty entity 42140A is of the type "BusinessTransactionDocumentParty" 42146A, and there is zero or one 42144A VendorParty entity 42140A for each Party package 42174. The CarrierParty entity 42148A is of the type "BusinessTransactionDocumentParty" 42154A, and there is zero or one 42152A CarrierParty entity 42148A for each Party package 42174.

The BuyerParty entity 42188 includes an InternalID entity 42194, an Address entity 42100A, and a Contact entity 42106A at the fourth level 42108. The InternalID entity 42194 is of the type "PartyInternalID" 42198, and there is one 42196 InternalID entity 42194 for each BuyerParty entity 42188. The Address entity 42100A is of the type "Address" 42104A, and there is zero or one 42102A Address entity 42100A for each BuyerParty entity 42104A. The Contact entity 42106A is of the type "BusinessTransactionDocumentContact" 42110A, and there is zero or one 42108A Contact entity 42106A for each BuyerParty entity 42188.

The Contact entity 42106A in BuyerParty entity 42188 includes an InternalID entity 42112A and an Address entity 42118A at the fifth level 42110. The InternalID entity 42112A is of the type "PartyInternalID" 42116A, and there is one 42114A InternalID entity 42112A for each Contact entity 42106A. The Address entity 42118A is of the type "Address" 42122A, and there is zero or one 42120A Address entity 42118A for each Contact entity 42106A.

The SellerParty entity 42124A contains the same elements 42126A at the fourth level 42108 as found for the BuyerParty entity 42188. ProductRecipientParty entity 42132A contains the same elements 42134A at the fourth level 42108 as found for the BuyerParty entity 42188. VendorParty entity 40A contains the same elements 42140A at the fourth level 42108 as found for the BuyerParty entity 42188. CarrierParty entity contains the same elements 42148A at the fourth level 42108 as found for the BuyerParty entity 42188.

The Location package 42176 includes a ShipToLocation entity 42156A and a ShipFromLocation entity 42174A at the third level 42106. The ShipToLocation entity 42156A is of a type "BusinessTransactionDocumentLocation" 42160A, and there is one or zero 42158A ShipToLocation 42156A for each Location package 42176. The ShipFromLocation entity 42174A is of a type "BusinessTransactionDocumentLocation" 42180A, and there is one 42178A ShipFromLocation entity 42174A for each Location package 42176.

The ShipToLocation entity 42186A includes an InternalID entity 42162A, and an Address entity 42168A at the fourth level 42108. The InternalID entity 42162A is of the type "LocationInternalID" 42166A, and there is one 42164A InternalID entity 42162A for each ShipToLocation entity 42156A. The Address entity 42168A is of the type "Address" 42172A, and there is zero or one 42170A Address entity 42168A for each ShipToLocation entity 42156A.

The ShipFromLocation entity 42174A contains the same elements 42176A at the fourth level 42108 as found for the ShipToLocation entity 42156A.

The DeliveryInformation package 42178 includes a DeliveryTerms entity 42182A and a DeliveryControl entity 42128B. There is one or zero 42184A DeliveryTerms entity 42182A for each DeliveryInformation package 42178. The DeliveryTerms entity 42182A is of type DeliveryTerms 42186A. The DeliveryTerms entity 42182A includes a DeliveryItemGroupID entity 42188A which is of type BusinessTransactionDocumentItemGroupID 42192A and there is one or zero occurrences 42190A. The DeliveryTerms entity 42182A includes a DeliveryPriorityCode 42194A which has one or zero occurrences 42196A and a data type of BusinessTransactionPriorityCode 42198A. The DeliveryTerms entity 42182A includes an IncoTerms 42100B which has one or zero occurrences 42102B and a data type of IncoTerms 42104B. The DeliveryTerms entity 42182A includes a PartialDelivery 42106B which has one or zero occurrences 42108B and a data type of PartialDelivery 42110B. The DeliveryTerms entity 42182A includes a QuantityTolerance 42112B which has one or zero occurrences 42114B and a data type of QuantityTolerance 42116B. The DeliveryTerms entity 42182A includes a Transport 42118B which has one or zero occurrences 42120B. The DeliveryTerms entity 42182A includes a Description 42122B which has one or zero occurrences 42124B and a data type of Description 42126B.

There is one or zero 42130B DeliveryControl entity 42128B for each DeliveryInformation package 42178. The DeliveryControl entity 42128B includes a DeliveryBlockedIndicator 42132B which is of type BusinessTransactionBlockedIndicator 42136B and there is one or zero occurrences 42134B.

The FollowUpMessage package 42180 includes a FollowUpDespatchedDeliveryNotification entity 42138B, a FollowUpBillingDueNotification entity 42148B, and a FollowUpInvoicingDueNotification entity 42158B. There is zero or one occurrence 42140B of the FollowUpDespatchedDeliveryNotification entity. The FollowUpDespatchedDeliveryNotification entity 42138B includes a RequirementCode 42142B having one occurrence 42144B and having a data type of FollowUpMessageRequirementCode 42146B. The FollowUpBillingDueNotification entity 42148B has one or zero occurrences 42150B. It includes a RequirementCode 42152B having one occurrence 42154B and having a data type of FollowUpMessageRequirementCode 42156B. The FollowUpInvoicingDueNotification entity 42158B has one or zero occurrences 42160B. It includes a RequirementCode 42162B having one occurrence 42164B and having a data type of FollowUpMessageRequirementCode 42166B.

The Attachment package 42182 includes an AttachmentWebAddress entity 42168B, which is of type WebAddress 42172B. There one or more 42170B AttachmentWebAddress entities 42168B for each Attachment 42182.

The Description package 42184 includes an InternalDescription entity 42174B and a Description entity 42180B. The InternalDescription entity 42174B is of type Description 42178B. There is one or zero 42176B of InternalDescription entities 42174B for each Description package 42184. The Description entity 42180B is of type Description 42184B. There is one or zero 42182B Description entities 42180B for each Description package 42184.

The DeliveryRequestItem package 42186 includes at least one 42188B DeliveryItem entity 42186B at the third level 42106, a ProductInformation package 42144C, a Batch package 42146C, a Party package 42148C, a Location package 42150C, an Attachment package 42154C, a Description package 42156C, and a ScheduleLine package 42158C.

The Item entity 42186B includes a BaseBusinessTransactionID entity 42192B, a BaseBusinessTransactionTypeCode entity 42198B, an ActionCode entity 42104C, a CreationDateTime entity 42110C, a LastChangeDateTime entity 42116C, a HierarchyRelationship entity 42122C and a ScheduleLineListCompleteTransmissionIndicator entity 42138C. The BaseBusinessTransactionID entity 42192B is of type BusinessTransactionDocumentID 42196B, and there is one 42194C BaseBusinessTransactionID entity 42196B for each Item entity 42186B. The BaseBusinessTransactionTypeCode entity 42198B is of type "BusinessTransactionDocumentTypeCode" 42102C, and there is one 42100C BaseBusinessTransactionTypeCode 42198B for each Item entity 42186B. The ActionCode entity 42104C is of type "ActionCode" 42108C, and there is zero or one 42106C ActionCode 42104C for each Item entity 42186B. The CreationDateTime entity 42110C is of type "DateTime" 42114C, and there is zero or one 42112C CreationDateTime entity 42110C for each Item entity 42186B. The LastChangeDateTime entity 42116C is of type "DateTime" 42120C, and there is zero or one 42118C LastChangeDateTime entity 42116C for each Item entity 42186B. There is zero or one 42124C HierarchyRelationship entity 42122C for each Item entity 42186B.

The HierarchyRelationship entity 42122C includes a ParentItemID 42126C having one or zero occurrences 42128C and a data type BusinessTransactionDocumentItemID 42130C. The HierarchyRelationship entity 42122C includes a TypeCode 42132C having one occurrence 42134C and a data type BusinessTransactionDocumentItemHierarchyRelationshipTypeCode 42136C.

The ScheduleLineListCompleteTransmissionIndicator entity 42138C is of type "CompleteTransmissionIndicator" 42142C, and there is zero or one 42140C ScheduleLineListCompleteTransmissionIndicator entity 42138C for each Item entity 42186B.

The ProductInformation package 42144C includes a Product entity 42160C at the fourth level 42108. The Product entity 42160C is of a type "BusinessTransactionDocumentProduct" 42164C, and there is one 42162C Product entity 42160C for each ProductInformation package 42144C.

The Product entity 42160C in the ProductInformation package 42144C includes an InternalID entity 42166C, and a Description entity 42172C. The InternalID entity 42166C is of a type "ProductInternalID" 42170C, and there is zero or one 42168C InternalID entity 42166C for each Product entity 42160C. The Description entity 42172C is of a type "Note" 42176C, and there is zero or one 42174C Description entity 42172C for each Product entity 42160C.

The Batch package 42146C includes a Batch entity 42178C at the fourth level 42108. The Batch entity 42178C is of a type "Batch" 42182C, and there is zero or one 42180C Batch entity 42178C for each Batch package 42146C. The Batch entity 42178C includes an ID entity 42184C at the fifth level 42110. The ID entity 42184C is of a type "BatchID" 42188C, and there is zero or one 42186C BatchID entity 42184C for each Batch entity 42178C.

The Party package 42148C includes a BuyerParty entity 42190C, a SellerParty entity 42198C, a ProductRecipientParty entity 42106D, a VendorParty entity 42114D, and a CarrierParty entity 42122D.

The BuyerParty entity 42190C is of the type "BusinessTransactionDocumentParty" 42196C, and there is one or zero 42194C BuyerParty entity 42190C for each Party package 42148C. The SellerParty entity 42198C is of the type "BusinessTransactionDocumentParty" 42104D, and there is zero or one 42102D SellerParty entity 42198C for each Party package 42148C. The ProductRecipientParty entity 42106D is of the type "BusinessTransactionDocumentParty" 42112D, and there is one or zero 42110D ProductRecipientParty entity 42106D for each Party package 42148C. The VendorParty entity 42114D is of the type "BusinessTransactionDocumentParty" 42120D, and there is zero or one 42118D VendorParty entity 42114D for each Party package 42148C. The CarrierParty entity 42122D is of the type "BusinessTransactionDocumentParty" 42128D, and there is zero or one 42126D CarrierParty entity 42122D for each Party package 42148C.

The BuyerParty entity 42190C contains the same elements 42192C at the fifth level 42110 as found in the fourth level 42108 for the BuyerParty entity 42188. The SellerParty entity 42198C contains the same elements 42100D at the fifth level 42110 as found in the fourth level 42108 for the BuyerParty entity 42188. ProductRecipientParty entity 42106D contains the same elements 42108D at the fifth level 42110 as found in the fourth level 42108 for the BuyerParty entity 42188. VendorParty entity 42114D contains the same elements 42116D at the fifth level 42110 as found in the fourth level 42108 for the BuyerParty entity 42188. CarrierParty entity 42122D contains the same elements 42124D at the fourth level 42108 as found for the BuyerParty entity 42188.

The Location package 42150C includes a ShipToLocation entity 42130D and a ShipFromLocation entity 42138D. The ShipToLocation entity 42130D is of a type "BusinessTransactionDocumentLocation" 42136D, and there is one or zero 42134D ShipToLocation 42130D for each Location package 42150C. The ShipFromLocation entity 42138D is of a type "BusinessTransactionDocumentLocation" 42144D, and there is one 42142D ShipFromLocation entity 42138D for each Location package 42150C.

The ShipToLocation entity 42130D contains the same elements 42132D at the fifth level 42110 as found in the fourth level 42108 for the ShipToLocation entity 42156A. The ShipFromLocation entity 42138D contains the same elements 42140D at the fifth level 42110 as found in the fourth level 42108 for the ShipFromLocation entity 42174A.

The DeliveryInformation package 42152C includes a DeliveryTerms entity 42146D and a DeliveryControl entity 42192D. There is one or zero 42148D DeliveryTerms entity 42146D for each DeliveryInformation package 42152C and is of type DeliveryTerms 42150D. The DeliveryTerms entity 42146D includes a DeliveryItemGroupID entity 42152D which is of type BusinessTransactionDocumentItemGroupID 42156D and there is one or zero occurrences 42154D. The DeliveryTerms entity 42146D includes a DeliveryPriorityCode 42158D which has one or zero occurrences 42154D and a data type of BusinessTransactionPriorityCode 42162D. The DeliveryTerms entity 42146D includes an Incoterms 42164D which has one or zero occurrences 42166D and a data type of Incoterms 42168D. The DeliveryTerms entity 42146D includes a PartialDelivery 42170D which has one or zero occurrences 42172D and a data type of PartialDelivery 42174D. The DeliveryTerms entity. 42146D includes a QuantityTolerance 42176D which has one or zero occurrences 42178D and a data type of QuantityTolerance 42180D. The DeliveryTerms entity 42146D includes a Transport 42182D which has one or zero occurrences 42184D. The DeliveryTerms entity 42146D includes a Description 42186D which has one or zero occurrences 42188D and a data type of Description 42190D.

There is one or zero 42194D DeliveryControl entity 42192D for each DeliveryInformation package 52C. The DeliveryControl entity 42192D includes a DeliveryBlocked 42196D which is of type BusinessTransactionBlockedIndicator 42100E and there is one or zero occurrences 42198D.

The Attachment package 42154C includes an AttachmentWebAddress entity 42102E. The AttachmentWebAddress entity 42102E is of the type "WebAddress" 42106E, and there is any number 42104E of AttachmentWebAddress entities 42102E for each Attachment package 42154C.

The Description package 42156C includes an InternalDescription entity 42108E and a Description entity 42114E. The InternalDescription entity 42142008E is of type Description 42112E. There is one or zero 42110E of InternalDescription entities 42108E. The Description entity 42114E is of a type "Description" 42118E, and there is any number 42116E of Description entities 42114E for each Description package 42156C.

The ScheduleLine package 42158C includes a ScheduleLine entity 42120E having an ID 42126E, ActionCode 42132E, Quantity 42138E, and DeliveryPeriod 42144E. The ScheduleLine entity 42120E has one or more occurrences 42122E and a data type DeliveryExecutionRequestItemScheduleLine 42124E. The ID 42126E has one occurrence 42128E with a data type of ScheduleLineID 42138E. The ActionCode 42132E has one or zero occurrences 42134E with a data type of ActionCode 42136E. The Quantity 42138E has one occurrence 42140E with a data type of Quantity 42142E. The DeliveryPeriod 42144E has one or zero occurrences 42146E with a data type of DateTimePeriod 42148E.

The ScheduleLine package 42158C includes a ConfirmedScheduleLine entity 42150E having an ID 42156E, ActionCode 42162E, Quantity 42168E, and DeliveryPeriod 42174E. The ConfirmedScheduleLine entity 42150E has zero or more occurrences 42152E and a data type DeliveryExecutionRequestItemScheduleLine 42154E. The ID 42156E has one occurrence 42158E with a data type of ScheduleLineID 42160E. The ActionCode 42162E has one or zero occurrences 42164E with a data type of ActionCode 42166E. The Quantity 42168E has one occurrence 42170E with a data type of Quantity 42172E. The DeliveryPeriod 42174E has one or zero occurrences 42176E with a data type of DateTimePeriod 42178E.

t) Delivery Schedule Interface

The DeliveryScheduleNotification message—a "delivery schedule" is also referred to as a "release"—is a tool that enables a buyer (sold-to party) to send a vendor details of his product requirements for deliveries in the short term and/or medium to long term. The liability of the deliveries can vary—from a binding purchase order, through authorization for production and/or material procurement release, to a forecast that is not binding. The delivery schedule refers to a scheduling agreement, that is, an outline agreement between the customer and vendor that sets out the conditions for purchase orders and deliveries.

A Release Processing business scenario may describe how a manufacturer's purchase orders are handled with delivery schedules. In this scenario, the manufacturer publishes the relevant delivery schedule on the "Inventory Collaboration Hub" for the vendor (supplier), who can view it over the Internet. The vendor then uses the "DespatchedDeliveryNotification" to announce a delivery that is based on the entire delivery schedule or one or more items in it. After the goods have been received, the manufacturer can use the "ReceivedDeliveryNotification" message to confirm receipt of the delivery to the vendor.

(1) Message Type

A DeliveryScheduleNotification is a message that is sent from a buyer to a vendor to notify the latter about the quantity of a product to be delivered with a certain liability at a certain date in accordance with a given scheduling agreement between the buyer and the vendor. The structure of the message type DeliveryScheduleNotification is specified in the message data type DeliveryScheduleNotificationMessage, which in turn is derived from the master data type DeliveryScheduleMessage. The legal liability for the deliveries is specified by the ScheduleLineComittmentCode at schedule line level in the message. Methods and systems consistent with the present invention use the package template for a BusinessTransactionDocument for an SCM Master Data depicted in FIG. 270B to derive the DeliverySchedule interface.

(2) Message Choreography

FIG. 422 depicts the message choreography for an exemplary DeliveryScheduleNotification process. The choreography involves two business entities: a buyer (e.g., a manufacturer) 42202 and a vendor (e.g., a supplier) 42204. The buyer 42202 uses a delivery schedule (e.g., DeliveryScheduleNotification message 42206) to notify the vendor 42204 about the buyer's 42202 replenishment requirements. The vendor 42204 then uses an advanced shipping notification (e.g. DespatchedDeliveryNotification message 42208) to announce a delivery that is based on a scheduling agreement or one or more items in the scheduling agreement. When the goods are received, the buyer 42202 may confirm receipt of the announced delivery to the vendor via ReceivedDeliveryNotification message 42210.

(3) Message Data Type Delivery Schedule Message

The data model for the message data type DeliveryScheduleMessage used to implement a DeliveryScheduleNotification message 42206, a DispatchedDeliveryNotification message 42208 and a ReceivedDeliveryNotification message 42210 is depicted in FIG. 423. The message data type DeliveryScheduleMessage groups the business information that is relevant for sending a business document in a message and the DeliverySchedule object in the business document. The message data type DeliveryScheduleMessage includes a DeliveryScheduleMessage package 42300. The DeliveryScheduleMessage 42300 includes a MessageHeader Package 42302, a DeliverySchedule Package 42304 and a DeliveryScheduleMessage entity 42306

(a) Message Header Package

The MessageHeader package 42302 groups the business information that is relevant for sending a business document in a message. The MessageHeader package 42302 includes a MessageHeader entity 42308. There is a 1:c relationship 42310 between the DeliveryScheduleMessage entity 42306 and the MessageHeader entity 42308.

(i) Message Header

A MessageHeader package 42302 groups the business information from the perspective of the sending application to identify the business document in a message, to provide information about the sender, and to provide any information about the recipient. The MessageHeader entity 42308 includes a SenderParty entity 42312 and a RecipientParty entity 42314. There is a espective 1:c relationship 42216 or 42218 between the MessageHeader entity 42208 and each of the SenderParty entity 42308 and a RecipientParty entity 42310. The MessageHeader entity 42308 is of type GDT: BusinessDocumentMessageHeader. The MessageHeader entity 42308 includes an ID and a CreationDateTime. The ID is the identification of the business document in the message. The CreationDateTime is the creation date of the business document in the message.

(ii) Sender Party

The SenderParty entity 42312 is the party responsible for sending a business document at the business application level. The SenderParty entity 42313 is of type GDT: BusinessDocumentMessageHeaderParty.

(iii) Recipient Party

The RecipientParty entity 42304 is the party responsible for receiving a business document at the business application level. The RecipientParty entity 42314 is of type GDT: BusinessDocumentMessageHeaderParty.

(b) Delivery Schedule Package

The DeliverySchedule package 42304 summarizes data that describes the delivery dates, products, quantities, and delivery locations. The DeliverySchedule package 42304 includes a DeliverySchedule entity 42324, a PartyPackage 42320, and a DeliveryScheduleItemPackage 42322.

(i) Delivery Schedule

The DeliverySchedule entity 42324 is a tool that is used by a buyer to notify a vendor about the quantity of a product to be delivered with a certain liability at a certain date in accordance with a given scheduling agreement between the buyer and the vendor. The DeliverySchedule entity 42324 includes an ID, a TypeCode, a CreationDateTime, and a Note. The ID is a unique identifier for the delivery schedule, and is of type GDT: BusinessTransactionDocumentID. The TypeCode is the coded representation of the type of a delivery schedule, and is of type GDT: DeliveryScheduleTypeCode. The CreationDateTime is the creation time of the delivery schedule, and is of type GDT: DateTime. The Note is the short description of a delivery schedule, and is of type GDT: Note. There is a 1:1 relationship 42326 between the DeliveryScheduleMessage entity 42306 and the DeliverySchedule 42324.

(ii) Party Package

The Party Package 42320 is the grouping of the business partners that may be relevant within the delivery schedule. The Party Package 42320 includes a BuyerParty entity 42328 and a VendorParty entity 42330. There is a 1:1 relationship between the DeliverySchedule entity 42324 and the BuyerParty entity 42328. There is a 1:c relationship 42334 between the DeliverySchedule entity 42324 and the VendorParty entity 42330.

(a) Buyer Party

The BuyerParty entity 42328 is the company or the person that buys goods or services. The BuyerParty entity 42328 is of type GDT:BusinessTransactionDocumentParty, where the InternalID, the StandardID, the BuyerID, and the VendorID are used. For communication within an enterprise, the InternalID is used for party entities. For enterprisewide communication, party entities are used for either the StandardID or the partner-role-specific ID of the receiving partner, in other words, for Supplier Collaboration scenarios the BuyerID is used, and for Customer Collaboration scenarios, the VendorID is used. Due to the different possibilities for ID use, ID elements of the particular Party are optional. In one implementation, the address of the BuyerParty entity 42328 may not be intended to be used as the delivery address. In this implementation, the ShipToLocation is provided for this purpose.

(b) Vendor Party

VendorParty entity 42330 is the company or the person to deliver the goods described in the delivery schedule. VendorParty entity 42330 is of type GDT:BusinessTransactionDocumentParty, where the InternalID, the StandardID, the BuyerID, and the VendorID are used.

(iii) Delivery Schedule Item Package

The DeliveryScheduleItem package 42322 groups a DeliveryScheduleItem or Item entity 42348 with its packages. The DeliveryScheduleItem package 42322 includes a BusinessTransactionDocumentReference package 42336, a Release package 42338, a Location Package 42340, a ProductInformation Package 42342, a DeliveryInformation Package 42344, and a ScheduleLine Package 42346.

(a) Delivery Schedule Item

The DeliveryScheduleItem entity 42348 is a statement regarding the requirement for a specific product at a certain location with reference to a scheduling agreement. There is a 1:cn relationship 42350 between DeliverySchedule entity 42342226A42224 and the DeliveryScheduleItem entity 42348. The DeliveryScheduleItem entity 42348 has the attribute actionCode, which is a coded representation of an instruction for the message receipient as to how to process a DeliveryScheduleItem entity 42348. DeliveryScheduleItem entity 42348 also includes an ID and a Note. The ID is the running number for the item in the DeliverySchedule document, and is of type GDT: BusinessTransactionDocumentItemID. The Note is the short description of a DeliveryScheduleItem entity 42348, and is of type GDT: Note.

(b) Business Transaction Document Reference Package

The BusinessTransactionDocumentReference package 42336 groups references to business documents that are relevant for the DeliveryScheduleNotification message 42206. The BusinessTransactionDocumentReference package 42336 includes a SchedulingAgreementReference entity 42356. There is a 1:1 relationship 42358 between the DeliveryScheduleItem entity 42348 and the SchedulingAgreementReference entity 42356. The SchedulingAgreementReference entity 42356 is the reference to an item in a scheduling agreement. SchedulingAgreementReference entity 42356 is of type GDT: BusinessTransactionDocumentReference.

(c) Release Package

The Release package 42338 groups the information about releases that are relevant for the DeliveryScheduleNotification message 42206. The Release package 42338 includes a Release entity 42360 and a PreviousRelease entity 42362. There is a 1:1 relationship 42364 between the DeliveryScheduleItem entity 42348 and the Release entity 42360 and a 1:1 relationship 42366 between the PreviousRelease entity 42362 and the DeliveryScheduleItem entity 42348.

(i) Release

The Release entity 42360 is a statement about the identification and validity of the release instance transferred in the delivery schedule item. The Release entity 42360 includes an ID, a CreationDateTime, and a HorizonDateTime. The ID is an identifier for the release instance transferred in the delivery schedule item. The ReleaseID is valid across messages and is assigned for a release period, such as a fiscal year or quarter. The ReleaseID, therefore, does not identify a scheduling agreement item. The ID is of type GDT: BusinessTransactionDocumentID. The CreationDateTime is the creation date and time of the release instance, and is of type GDT: DateTime. The HorizonDateTime is the release horizon, that is, the end date of the release period, and is of type GDT: DateTime.

(ii) Previous Release

The PreviousRelease entity 42362 is a statement about the identification and validity of the last release instance previously transferred in a delivery schedule. The PreviousRelease entity 42362 includes an ID and a CreationDateTime. The ID is a unique identifier of the PreviousRelease entity 42362, and is of type GDT: BusinessTransactionDocumentID. The CreationDateTime is the Creation date and time of the PreviousRelease entity 42362, and is of type GDT: DateTime.

(d) Location Package

The Location Package 42340 is a grouping of the locations that may be relevant within the delivery schedule. The Location package 42340 includes a ShipFromLocation entity 42368, a TransshipmentLocation entity 42370, and a ShipToLocation entity 42372. There is a 1:c relationship 42374 between the DeliveryScheduleItem entity 42348 and the ShipFromLocation entity 42368. There is a 1:c relationship 42376 between the DeliveryScheduleItem entity 42348 and the TransshipmentLocation entity 42370. There is a 1:1 relationship 42378 between the DeliveryScheduleItem entity 42348 and the ShipToLocation entity 42372. For communication within an enterprise, the InternalID is used for location entities. For enterprisewide communication, location entities are used for either the StandardID or the partner-role-specific ID of the receiving partner. In other words, for Supplier Collaboration scenarios the BuyerID is used, and for Customer Collaboration scenarios, the VendorID is used. Due to the different possibilities for ID use, the ID elements of the particular location are optional.

(i) Ship From Location

ShipFromLocation entity 42368 is the place from where the ordered products are delivered. ShipFromLocation entity 42368 is of type GDT: BusinessTransactionDocument ShipFromLocation, where the InternalID, StandardID, BuyerID, VendorID, and UnloadingLocation and Address are used.

(ii) Transshipment Location

TransshipmentLocation entity 42370 is the place at which the ordered products are transshipped on their way to the product receipient. TransshipmentLocation entity 42370 is of type GDT: BusinessTransactionDocumentTransshipmentLocation, where the InternalID, StandardID, BuyerID, VendorID, and UnloadingLocaiton and Address are used.

(iii) Ship To Location

ShipToLocation entity 42372 is the place to which the ordered products are delivered. ShipToLocation entity 42372 is of type GDT: BusinessTransactionDocument-ShipToLocation, where the InternalID, StandardID, BuyerID, VendorID, and UnloadingLocation and Address are used.

(e) Product Information Package

The ProductInformation package 42342 is a summary of the information that characterizes the product to be delivered in greater detail. The ProductInformation package 42342 includes a Product entity 42380. There is a 1:1 relationship 42382 between the DeliveryScheduleItem entity 42348 and the product entity 42380. The Product entity 42380 is either a tangible or intangible good that is a part of the business activities of a company. The Product entity 42380 may be traded and contributes directly or indirectly to value added. The Product entity 42380 is of type GDT: BusinessTransactionDocumentProduct, where the InternalID, the StandardID, the BuyerID, and the VendorID are used. For communication within an enterprise, the InternalID is used for product entities. For enterprisewide communication, product entities are used for either the StandardID or the partner-role-specific ID of the sending or the receiving partner. In other words, for Supplier Collaboration scenarios, the BuyerID is used, and for Customer Collaboration scenarios, the VendorID is used. Due to the different possibilities for ID use, ID elements of the particular product are optional.

(f) Delivery Information Package

The DeliveryInformation package 42344 summarizes the information about the delivery schedule item. The DeliveryInformation package 42344 includes a PreviousDelivery entity 42384 and a CumulativeDelivery entity 42386. There is a respective 1:c relationship 42388 or 42390 between the DeliveryScheduleItem entity 42348 and each of the PreviousDelivery entity 42384 and the CumulativeDelivery entity 42386.

(i) Previous Delivery

PreviousDelivery entity 42384 includes data about the physical delivery that was last received. PreviousDelivery entity 42384 include an ID, a ReceivedQuantity, and a ReceiptDateTime. The ID is an identifier of the delivery, and is of type GDT: BusinessTransactionDocumentID. The ReceivedQuantity is the quantity received, and is of type GDT: Quantity. The ReceiptDateTime is the time at which the delivery was received, and is of type GDT: DateTime.

(ii) Cumulative Delivery

CumulativeDelivery entity 42386 includes the cumulated quantities of the deliveries for a product in the specified validity period. CumulativeDelivery entity 42386 includes a ValidityPeriod, a ReceivedQuantity, a ReconciliationDateTime, and a ReconciliationQuantity. The ValidityPeriod is the validity period for the cumulated delivery quantities, and is of type GDT: DateTimePeriod. The ReceivedQuantity is the cumulated received delivery quantity in the specified validity period. If a validity period is not specified, the cumulated quantity refers to the period in the referenced scheduling agreement item or the running fiscal year, respectively, and is of type GDT: Quantity. The ReconciliationDateTime is the date and time when the cumulative received quantity is reset or set to zero. If the ReconciliationDateTime is not specified, the agreed cumulative quantity refers to the closing date/time of the fiscal year as specified in the referenced scheduling agreement item. ReconciliationDateTime is of type GDT: DateTime. The ReconciliationQuantity is the cumulated received quantity at the end of a delivery period in accordance with the date/time specified in ReconciliationDateTime. This quantity (also referred to as agreed cumulative quantity) is used for information purposes and to provide legally binding synchronization for the delivery quantities, that is, the goods receipts of the buyer party and the goods issues of the vendor. ReconciliationQuantity is of type GDT: Quantity.

(g) Delivery Schedule Item Schedule Line Package

The DeliveryScheduleItemScheduleLine package 42346 is a collection of one or more schedule lines for a delivery schedule item. The DeliveryScheduleItemScheduleLine package 42346 includes a DeliveryScheduleItemScheduleLine entity 42352. There is a 1:cn relationship 42354 between the DeliveryScheduleItem entity 42348 and the DeliveryScheduleItemScheduleLine entity 42352.

The DeliveryScheduleItemScheduleLine entity 42352 is a statement about the quantity of a product to be delivered with a certain liability within a certain period of time. DeliveryScheduleItemScheduleLine entity 42352 includes a CommittmentCode, a ProductChangeID, a DeliveryPeriod, a PickupPeriod, a Quantity, and a note. The CommittmentCode is the coded representation that describes the planning significance of the schedule line information and thus also specifies the (legal) liability with respect to the ordered quantities and specified delivery dates for a product. CommittmentCode is of type GDT: ScheduleLineCommittmentCode. The ProductChangeID is an identifier of a change to a product that does not affect its features observed by a user. Since the ProductChangeID can vary between the different delivery dates, it is specified at schedule line level. ProductChangeID is of type GDT: ProductChangeID. The DeliveryPeriod is the period in which the product is to be delivered, and is of type GDT: DateTimePeriod. The PickupPeriod is the period in which the product can or should be picked up from the vendor (for pickup scenarios), and is of type GDT: DateTimePeriod. The Quantity is the quantity of a product to be delivered or picked up, and is of type GDT: Quantity. The Note is the short description of a ScheduleLine in the delivery schedule document, and is of type GDT: Note.

(4) Element Structure of Delivery Schedule Message

FIGS. 424A-0 depict the element structure for DeliveryScheduleNotification. The element structure is similar to the data model, but provides additional information regarding the details of the interface. The element structure identifies the different packages 42400 in the interface, and represents the entities at various levels within the interface. As depicted in FIG. 424A, the interface for DeliveryScheduleNotification includes six levels 42402, 42404, 42406, 42408, 42410, and 42412. The element structure identifies the occurrence or cardinality 42414 between the entities of the interface, and provides data type information (i.e., G/CDT type 42416) regarding the data type that provides the basis for the entity. The outermost package of this interface is a DeliveryScheduleNotificationMessage package 42424, which includes an DeliveryScheduleNotificationMessage entity 42422 at the first level 42402. The DeliveryScheduleNotificationMessage entity 42422 is of type "DeliveryScheduleNotificationMessage" 42428.

The DeliveryScheduleNotificationMessage package 42426 includes a MessageHeader package 42432 and a DeliverySchedule package 42434. The MessageHeader package 42432 includes a MessageHeader entity 42436, which is of type generic data type "BusinessDocumentMessageHeader" 42440. There is one 42438 MessageHeader entity 42436 for each DeliveryScheduleNotificationMessage entity 42426.

The MessageHeader entity 42436 includes an ID 42446, a Reference ID 42456, and a CreationDateTime 42466. The ID 42446 is of type BusinessDocumentMessageID 42450. The Referenced 42456 is of type BusinessDocumentMessageID 42460. The CreationDateTime 42466 is of type DateTime 42470. There is one 42448 ID 42446 for each MessageHeader entity 42436, one or zero 42458 Referenced 42456 for each MessageHeader entity 42436, and one 42468 CreationDateTime 42466 for each MessageHeader entity 42436.

The MessageHeader entity 42436 also includes a SenderParty entity 42474 and a RecipientParty entity 42400A. The SenderParty entity 42474 is of type BusinessDocumentMessageHeaderParty 42478. The RecipientParty entity 42400A is also of type BusinessDocumentMessageHeaderParty 42404A. There is one or zero 42476 SenderParty entity 42474 for each MessageHeader entity 42436, and there is one or zero 42402A RecipientParty entity 42400A for each MessageHeader entity 42436.

The SenderParty entity 42474 includes an InternalID 42484 and a StandardID 42492. The InternalID 42484 has zero or one occurrences 42486 for each SenderParty entity 42474 and a data type of PartyInternalID 42488. The StandardID 42492 has zero or n occurrences 42494 for each SenderParty entity 42474 and a data type of PartyStandardID 42496. The RecipientParty entity 42400A includes an InternalID 42410A and a StandardID 42418A. The InternalID 42410A has zero or one occurrences 12A for each Recipient Party 42400A and a data type of PartylnternalID 42414A. The StandardID 42418A has zero or n occurrences 42420A for each Recipient Party 42400A and a data type of PartyStandardID 42422A.

The DeliverySchedule package 42414A includes a DeliverySchedule entity 42426A, a Party package 42462A, an Item package 42464A and a Note 42486B. There is one or zero 42488B Note, and the Note 42486B is of type Note 42490B. There is one 42428A DeliverySchedule entity 42426A for each DeliveryScheduleNotificationMessage entity 26. The DeliverySchedule entity 42426A includes an ID 42434A, a TypeCode 42444A, and a CreationDateTime 42454A. There is one or zero 42436A ID 42434A for each DeliverySchedule entity 42426A. The ID 42434A is of type BusinessTransactionDocumentID 42438A. The TypeCode 42444A has zero or one 42446A occurrences for each DeliverySchedule entity 42426A and is of type DeliveryScheduleTypeCode 42448AA. A CreationDateTime 42454A has one occurrence 42456A for each DeliverySchedule entity 42426A and is of type DateTime 42458A.

The Party package 42462A includes a BuyerParty entity 42466A and a VendorParty entity 42426B. The BuyerParty 42466A is of type BusinessTransactionDocumentParty 42466A. There is one or zero 42468A BuyerParty entity 42466A for each DeliverySchedule entity 42426A. The VendorParty entity 42426B is of type BusinessTransactionDocumentParty 42430B. There is one 42428B VendorParty entity 42426B for each DeliverySchedule entity 42426A.

The BuyerParty entity 42466A includes an InternalID 42476A, a StandardID 42486A, a BuyerID 42496A, a VendorID 42406B, and an Address 42416B. The InternalID 42476A has zero or one occurrences 42478A for the BuyerParty entity 42466A and a data type of PartyInternalID 42480A. The StandardID 42486A has zero or n occurrences 42488A for the BuyerParty entity 42466A and a data type of PartyStandardID 42490A. The BuyerID 42496A has zero or one occurrences 42498A for the BuyerParty entity 42466A and a data type of PartyPartyID 42400B. The VendorID 42406B has zero or one occurrences 42408B for the BuyerParty entity 42466A and a data type of PartyPartyID 42410B. The Address 42416B has zero or one occurrences 42418B for each BuyerParty entity 42466A and a data type of Address 42420B.

The VendorParty entity 42426B includes an InternalID 42436B, a StandardID 42446B, a BuyerID 42456B, a VendorID 42466B, and an Address 42476B. The InternalID 42436B has zero or one occurrences 42438B for the VendorParty entity 42426B and a data type of PartyInternalID 42440B. The StandardID 42446B has zero or n occurrences 42448B for the VendorParty entity 42426B and a data type of PartyStandardID 42450B. The BuyerID 42456B has zero or one occurrences 42458B for the VendorParty entity 42426B and a data type of PartyPartyID 42460B. The VendorID 42466B has zero or one occurrences 42468B for the VendorParty entity 42426B and a data type of PartyPartyID 42470B. The Address 42476B has zero or one occurrences 42478B for the VendorParty entity 42426B and a data type of Address 42480B.

The Item package 42464A includes an Item entity 42496B. There is one or more 42498B Item entities 42496B for each DeliverySchedule entity 42426A. The Item entity 42496B is of type DeliveryScheduleItem 42400C. The Item entity 42496B includes a @actionCode 42404C, and an ID 42414C. The @actionCode 42404C is of type ActionCode 42404C, and there is one or zero 42406C @actionCode 42404C for each Item entity 42496B. The ID 42414C is of type BusinessTransactionDocumentItemID 42418C, and there is one 42416C ID 42414C for each Item entity 42496B.

The Item package 42464A also includes a BusinessTransactionDocumentReference package 42424C, a Release package 42426C, a Location package 28C, a ProductInformation package 42430C, a DeliveryInformation package 42432C, a ScheduleLine package 42434C and a Note entity 42468H of data type Note 42472H. There is zero or one 42470H Note entity 42468H for each Item entity 42496B.

The BusinessTransactionDocumentReference package 42424C includes a SchedulingAgreementReference entity 42436C of type BusinessTransactionDocumentReference 42440C. There is one 42438C SchedulingAgreementReference entity 42436C for each Item entity 42496B.

The Release package 42426C includes a Release entity 42444C, and a PreviousRelease entity 42476C. There is one 42446C Release entity 42444C for each Item entity 42496B. The Release entity 42444C includes an ID 42450C, a CreationDataTime 42460C and a HorizonDataTime 42468C. The ID 42450C is of type BusinessDocumentMessageID 42454C. The CreationDataTime 42460C is of type DateTime 42464C. The HorizonDataTime 42468C is of type DateTime 42472C. There is one 42452C ID 42450C for each Item entity 42496B, one or zero 42462C CreationDataTime 42460C for each Item entity 42496B, and one or zero 42470C HorizonDataTime 42468C for each Item entity 42496B. The PreviousRelease entity 42476C includes an ID 42482C, and a CreationDataTime 42492C. The ID 42482C is of type BusinessDocumentMessageID 42486C. The CreationDataTime 42492C is of type DateTime 42496C. There is one 42484C ID 42482C for each Item entity 42496B, and one or zero 42494C CreationDataTime 42492C for each Item entity 42496B.

The Location package 42428C includes a ShipFromLocation entity 42400D, and a TransshipmentLocation entity 42410E, and a ShipToLocation entity 42470E. The ShipFromLocation entity 42400D is of type BusinessTransactionDocument ShipFromLocation 42404D. There is one or zero 42402D ShipFromLocation entity 42400D for each Item entity 42496B. The TransshipmentLocation entity 42410E is of type of BusinessTransactionDocumentTransshipmentLocation 42414E. There is one or zero 42412E TransshipmentLocation entity 42410E for each Item entity 42496B. The ShipToLocation entity 42470E is of type BusinessTransactionDocumentLocation 42474E. There is one 42472E ShipToLocation entity 42470E for each Item entity 42496B.

The ShipFromLocation entity 42400D includes an InternalID 42410D, a StandardID 42420D, a BuyerID 42430D, a VendorID 42440D, a LoadingLocation entity 42450D, and an Address 42400E. The InternalID 42410D has zero or one occurrences 42412D for the ShipFromLocation entity 42400D and a data type of LocationInternalID 42414D. The StandardID 42420D has zero or n occurrences 42422D for the ShipFromLocation entity 42400D and a data type of LocationStandardID 42424D. The BuyerID 42430D has zero or one occurrences 42432D and a data type of LocationPartyID 42434D. The VendorID 42440D has zero or one occurrences 42442D for the ShipFromLocation entity 42400D and a data type of LocationPartyID 42444D. The LoadingLocation entity 42450D has zero or one occurrences 42452D for the ShipFromLocation entity 42400D and a data type of BusinessTransactionDocumentLocation 42454D. The Address 42400E has one or zero occurrences 42402E for the ShipFromLocation entity 42400D and a data type of Address 42404E. The LoadingLocation entity 42450D includes an InternalID 42460D, a StandardID 42470D, a BuyerID 42480D, and a VendorID 42490D. The InternalID 42460D has zero or one occurrences 42462D for each LoadingLocation entity 42450D and a data type of LocationInternalID 42464D. The StandardID 42470D has zero or one occurrences 42472D for each LoadingLocation entity 42450D and a data type of LocationStandardID 42474D. The BuyerID 42480D has zero or one occurrences 42482D for each LoadingLocation entity 42450D and a data type of LocationPartyID 42484D. The VendorID 42490D has zero or one occurrences 42492D for each LoadingLocation entity 42450D and a data type of LocationPartyID 42494D.

The TransshipmentLocation entity 42410E includes an InternalID 42420E, a StandardID 42430E, a BuyerID 42440E, a VendorID 42450E and an Address 42460E. The InternalID 42420E has zero or one occurrences 42422E for each TransshipmentLocation entity 42410E and a data type of LocationInternalID 42424E. The StandardID 42430E has zero or n occurrences 42432E for each TransshipmentLocation entity 42410E and a data type of LocationStandardID 42434E. The BuyerID 42440E has zero or one occurrences 42442E for each TransshipmentLocation entity 42410E and a data type of LocationPartyID 42444E. The VendorID 42450E has zero or one occurrences 42452E for each TransshipmentLocation entity 42410E and a data type of LocationPartyID 42454E. The Address 42460E has one or zero occurrences 42472E for each TransshipmentLocation entity 42410E and a data type of Address 42464E.

The ShipToLocation entity 42470E includes an InternalID 42480E, a StandardID 42490E, a BuyerID 42400F, a VendorID 42410F and an Unloading Location entity 42420F. The InternalID 42480E has zero or one occurrences 42482E for each ShipToLocation entity 42470E and a data type of LocationInternalID 42484E. The StandardID 42490E has zero or n occurrences 42492E for each ShipToLocation entity 42470E and a data type of LocationStandardID 94E. The BuyerID 42400F has zero or one occurrences 42402F for each ShipToLocation entity 42470E and a data type of LocationPartyID 42404F. The VendorID 42410F has zero or one occurrences 42412F for each ShipToLocation entity 42470E and a data type of LocationPartyID 42414F. The Unloading Location entity 42420F has one or zero occurrences 42422F for each ShipToLocation entity 42470E and a data type of BusinessTransactionDocumentLocation 42424F.

The Unloading Location entity 42420F includes an InternalID 42430F of type LocationInternalID 42434F, a StandardID 42440F of type LocationStandardID 42444F, a BuyerID 42450F of type LocationPartyID 42454F, and a VendorID 42460F of type LocationPartyID 42464F. In one implementation, for each Unloading Location entity 42420F, there is zero or one 42432F InternalID 42430F, zero or n 42442F StandardIDs 42440F, zero or one 42452F BuyerID 42450F, and zero or one 42462F VendorID 42460F.

The ProductInformation package 42430C includes a Product entity 42480F of type BusinessTransactionDocumentProduct 42484F. There is one 42482F Product entity 42480F for each Item entity 42496B. The Product entity 42480F includes an InternalID 42490F of type ProductInternalID 42494F, a StandardID 42400G of type ProductStandardID 42404G, a BuyerID 42410G of type ProductPartyID 42414G, and a VendorID 42420G of type ProductPartyID 42424G. In one implementation, for each Product entity 42480F, there is zero or one 42492F InternalID 42490F, zero or one 42402G StandardIDs 42400G, zero or one 42412G BuyerID 42410G, and zero or one VendorID 42420G.

The DeliveryInformation package 42432C includes a PreviousDelivery entity 42430G and a CumulativeDelivery entity 42462G. There is one or zero 42432G PreviousDelivery entity 42430G for each Item entity 42496B. There is one or zero 42464G CumulativeDelivery entity 42462G for each Item entity 42496B.

The PreviousDelivery entity 42430G includes one 42438G ID entity 42436G of type BusinessTransactionDocumentID 42440G. The PreviousDelivery entity entity 42430G also includes one or zero 42448G ReceivedQuantity 42446G of type Quantity 42449G. The PreviousDelivery entity 42430G further includes one or zero 42456G ReceiptDateTime 42454G of type DateTime 42458G.

The CumulativeDelivery entity 42462G includes a ValidityPeriod 42468G of type DateTimePeriod 42472G, a ReceivedQuantity 42476G of type Quantity 42480G, a ReconcilliationDateTime 42486G of type DateTime 42490G, and a ReconcilliationQuantity 42498G of type Quantity 42498G. In one implementation, for each CumulativeDelivery entity 42462G, there is zero or one 42470G ValidityPeriod 42468G, one 42478G ReceivedQuantity 42476G, zero or one 42488G ReconcilliationDateTime 42486G, and zero or one 42496G ReconcilliationQuantity 42498G.

The ScheduleLine package 42434C includes a ScheduleLine entity 42404H of type DeliveryScheduleItemLine 42408H. There is one or more 42406H ScheduleLine entities 42404H for each Item 96B. Each ScheduleLine entity 42404H includes a CommitmentCode entity 42412H of type ScheduleLineCommitmentCode 42416H, a ProductChangeID 42422H of type ProductChangeID 42426H, a DeliveryPeriod 42432H of type DateTimePeriod 42436H, a PickUpPeriod 42440H of type DateTimePeriod 42444H, a Quantity 42448H of type Quantity 42452H, and a Note 42458H of type Note 42462H. In one implementation, for each ScheduleLine entity 42404H, there is one 42414H CommitmentCode entity 42412H, zero or one 42424H ProductChangeID 42422H, zero or one 42434H DeliveryPeriod 42432H, zero or one 42442H PickUpPeriod 42440H, one 42450H Quantity, and zero or one 42460H Note 42458H.

u) Invoice Issued Information

One motivating business scenario for the InvoiceIssuedInformation interface is the Sell From Stock scenario. In the Sell From Stock scenario, accepting and creating an order may be the first stage in the process. The elements of the order relevant for the delivery are communicated to the FC for the purposes of order fulfillment. At the same time, the elements of the order that are relevant for billing are transferred to the billing due list in BAC Billing. After the delivery has been made, the elements of the delivery that are relevant for billing are transferred to the billing due list in Billing, which generates invoices (and credit memos) on the basis of these.

In the Sell From Stock scenario, several specific recipients will then provide information about the invoices that have been generated. In particular Recipient: BAC CRM will provide information about the InvoiceIssuedInformation, Recipient: BAC Accounting will provide information about the InvoiceAccountingInformation, and Recipient: BAC Payment will provide information about the PaymentDueNotification.

(1) Message Type Invoice Issued

InvoiceIssuedInformation provides information about the invoice items used for billing, the services provided, the products delivered, and the credit memo or debit memo requests that have been billed, and the quantities or the values that have been billed. The message type InvoiceIssuedInformation is based on the message data type InvoiceIssuedMessage. Contract management/sales may require information about billing that has been carried out, in order to adapt the status of order items (partially billed, billed) and be able to trigger follow-up actions if they are required (for example, updating credit information).

(2) Message Choreography

FIG. 425 depicts a graphical representation 42500 of an InvoiceIssuedInformation 42510 between business entities in accordance with methods and systems consistent with the present invention. The illustrative message choreography is a logical sequence of messages that is not dependent on actual scenarios. In the implementation shown in FIG. 425, the illustrative business entities include Customer 42502, Billing 42504, and Customer Relationship Management 42506. In the illustrative example, Billing 42504 (invoice creation) uses InvoiceIssuedInformation 42510 to inform Customer Relationship Management 42506 about the contents of an invoice (InvoiceRequest 42508) that has been sent to a customer.

(3) Message Data Type Invoice Issued Message

As shown in FIG. 426, the message data type InvoiceIssuedMessage 42602 includes the InvoiceIssued object included in the business document and the business information that is relevant for sending a business document in a message. It includes a MessageHeader package 42604 and an InvoiceIssued package 42606. The message data type InvoiceIssuedMessage makes the structure available for the message type InvoiceIssued and the relevant interfaces.

(a) Message Header Package

A MessageHeader package 42604 groups together the business information that is relevant for sending a business document in a message. The MessageHeader 42604 may not be required for the InvoiceIssuedInformation because there may be no intention to reference messages or communicate with several instances of the components involved.

(b) Invoice Issued Package

The InvoiceIssued package 42606 summarizes the invoice information relevant for contract management/sales. It includes an InvoiceIssuedItem package 42610. The InvoiceIssued Message entity 42608 includes an InvoiceIssued entity 42612 and has a 1:1 relationship 42614 with it.

The InvoiceIssued entity 42612 summarizes the invoice information relevant for contract management/sales. The InvoiceIssued entity 42612 includes information about which order items, items in credit and debit memo requests or delivery items have been billed to what extent. The InvoiceIssued entity 42612 includes a BaseInvoiceID, a CancellationInvoiceIndicator, and an IntraCorporateIndicator. The BaseInvoiceID may be a unique identifier for the base invoice for the InvoiceIssueNotification, and is of type GDT: BusinessTransactionDocumentID. The CancellationInvoiceIndicator is the indicator that specifies whether the invoice is a cancellation invoice. This can affect the status of the order item. For example, canceling an invoice can sometimes mean that a billed order item is no longer billed or only partially billed (milestone billing). The CancellationInvoiceIndicator is of type GDT: InvoiceCancellationInvoiceIndicator. The IntraCorporateIndicator is the indicator that specifies whether the invoice is an intracorporate invoice (intercompany billing). In contrast to a billing document, an intracorporate invoice has no effect on the status of the order item. The IntraCorporateIndicator is of type GDT: InvoiceIntraCorporateIndicator. The base invoice is specified using the BaseInvoiceID.

(c) Invoice Issued Item Package

The InvoiceIssuedItem package 42610 groups together items from an InvoiceIssued message. It includes a BusinessTransactionDocumentReference package 42616.

(i) Invoice Issued Item

An InvoiceIssuedItem entity 42618 specifies the quantity or the partial value of a product billed with respect to a business transaction. The InvoiceIssued entity 42612 includes the InvoiceIssuedItem entity 42618 and has a 1:n relationship 42620 with it. Item 42618 includes a BaseInvoiceItemID, a BilledQuantity, and a BilledValue. The BaseInvoiceItemID is the number of the item in the base invoice for the InvoiceIssued, and is of type GDT: BusinessTransactionDocumentItemID. The BilledQuantity is of type GDT: Quantity. With respect to BilledValue, in general, the net value is used to describe the billed value. However, the term NetValue is deliberately not used to emphasize the particular semantic of the "billed value." The BilledValue is of type GDT: Amount.

The BaseInvoiceItemID is specified, together with either a billed quantity or a billed value. An InvoiceIssuedItem entity 42618 is usually not regarded as being the same as an InvoiceItem. Rather it includes detailed information from an invoice item. Usually, business transactions are (partial) deliveries for an order item. However, they can also be items from credit and debit memo requests or deliveries without orders.

(ii) Business Transaction Document Reference Package

The BusinessTransactionDocumentReference package 42616 groups together the references to business documents that have been billed. It includes a SalesOrderReference entity 42622 and a DeliveryReference entity 42624. The InvoiceIssuedItem entity 42618 includes the SalesOrderReference entity 42622 and the DeliveryReference entity 42624 and has a 1:c relationship (42626 and 42628 respectively) with them.

(a) Sales Order Reference

The SalesOrderReference entity 42622 is the reference to an order or an item within an order. The SalesOrderReference entity 42622 is of type GDT: BusinessTransactionDocumentReference. The SalesOrderReference entity 42622 includes the order number assigned by the seller. The item is specified in the order. Contract management/sales uses the information to adapt the status of individual items and therefore finds out which items in the order have already been billed.

(b) Delivery Reference

The DeliveryReference entity 42624 is the reference to a delivery or an item within a delivery. The DeliveryReference entity 42624 is of type GDT: BusinessTransactionDocumentReference. In one implementation, this reference cannot be specified in the case of order-related billing.

(4) Element Structure

FIGS. 427A and B depict the element structure for InvoiceIssuedInformation. The element structure is similar to the data model, but provides additional information regarding the details of the interface. The element structure identifies the different packages 42700 in the interface, and represents the entities at various levels within the interface. As depicted in FIGS. 427A and B, the interface for InvoiceIssuedInformation includes four levels 42702, 42704, 42706, and 42708. The element structure identifies the cardinality 42710 between the entities of the interface, and provides information 42712 (i.e., type and name) regarding the data type that provides the basis for the entity. The outermost package of this interface is an InvoiceIssuedMessage package 42714, which includes an InvoiceIssuedMessage entity 42716 at the first level 42702. The InvoiceIssuedMessage entity 42716 is of type message data type ("MDT") "InvoiceIssuedMessage" 42720.

The InvoiceIssuedMessage package 42714 includes an InvoiceIssued package 42722. The InvoiceIssued package 42722 includes an InvoiceIssued entity 42724. There is one 42726 InvoiceIssued entity 42724 for each InvoiceIssuedMessage entity 42716 and the InvoiceIssued entity 42724 is of type GDT InvoiceIssued 42728. The InvoiceIssued entity 42724 includes a BaseInvoiceID 42730, a CancellationInvoiceIndicator 42736, and an IntraCorporateIndicator 42742.

There is one 42732 BaseInvoiceID 42730 for each InvoiceIssued entity 42724. The BaseInvoiceID 42730 is of type GDT BusinessTransactionDocumentID 42734. A CancellationInvoiceIndicator 42736 has one occurrence 42738 and is of type GDT InvoiceCancellationInvoiceIndicator 42740. IntraCorporateIndicator 42742 has one occurrence 42744 and is of type GDT IntraCorporateIndicator 42746.

The Item package 42748 includes an Item entity 42750. There is one or more 42752 Item entities 42750 for each InvoiceIssued entity 42724, and the Item entity 42750 is of type GDT Item 42754. The Item entity 42750 includes a BaseInvoiceItemID 42756, a BilledQuantity 42762, and a BilledValue 42768. The BaseInvoiceItemID 42756 is of type GDT BusinessTransactionDocumentItemID 42760, and there is one 42758 BaseInvoiceItemID 42756 for each Item entity 42750. The BilledQuantity 42762 is of type GDT Quantity 42769, and there is one or zero 42764 BilledQuantity 42762 for each Item entity 42750. There is one or zero 42770 BilledValue 42768 for each Item entity 42750. The BilledValue 42768 is of type GDT Amount 42772.

The Item package 42748 also includes a BusinessTransactionDocumentReference package 42774. The BusinessTransactionDocumentReference package 42774 includes a SalesOrderReference entity 42776 and a DeliveryReference entity 42782. The SalesOrderReference entity 42776 is of type GDT BusinessTransactionDocumentReference 42780. There is one or zero 42778 SalesOrderReference entities 42776 for each Item entity 42750. The DeliveryReference entity 42782 is of type GDT BusinessTransactionDocumentItemID 42786 and there is one or zero occurrences 42784.

v) Product Activity Interface

The ProductActivityNotification message is intended for planning and information purposes, generally for a supplier. It can contain individual entries and time series to specify the stock, demand, and consumption of products of a buyer (retailers, wholesalers, or manufacturers) in reference to a ship-to location. The message itself implies no authorization from the message recipient for the manufacture or shipping of products. Such an authorization can be made by scheduling agreements or other agreements.

In an interenterprise variant, the ProductActivityNotification message is sent within the Business Scenarios Responsive Replenishment and Collaborative Planning, Forecasting, and Replenishment (CPFR) from a buyer (retail company) to a vendor (consumer products manufacturer). In an intra-enterprise variant, this message is sent within the framework of the Business Scenarios Supplier Managed Inventory from an executive system (ERP) to the Inventory Collaboration Hub (ICH) for the planning and development of replenishment deliveries from the supplier. The supplier receives data about the existing stock and the forecasted consumption of a product.

(1) Message Type Product Activity Notification

A ProductActivityNotification is a message that transfers product-related activities of a buyer (retailer, wholesaler, or manufacturer) to a vendor (supplier). On that basis, the vendor can then take on the replenishment planning for the buyer. Product-related activities include, for example, current or planned product sales, current or planned product consumptions, stockouts, or open purchase order quantities.

The structure of the message type ProductActivityNotification is specified in the message data type ProductActivityMessage. Methods and systems consistent with the present invention use the package template for a BusinessTransactionDocument for an SCM Master Data depicted in FIG. 270B to derive the ProductActivity interface.

The notification transfer is complete ("complete transmission"). For the EAN.UCC, the equivalent for this notification is called a "ProductActivity."

(2) Message Choreography

FIG. 428 depicts the message choreography for scenario "CPFR." It describes the possible logical sequence of the message types necessary for the scenario realization.

As depicted in FIG. 428, a buyer 42802 sends a ProductDemandInfluencingEventNotification 42806 to a vendor 42804. The ProductDemandInfluencingEventNotification 42806 includes long to mid-term demand information that is linked to an activity. Together with the product forecast information, i.e., ProductForecastNotification 42808, that is also sent by the buyer 42802, or, with short-term incidental current sales information, i.e., ProductActivityNotification 42810, this information can be used by the vendor 42804 for the creation of a forecast for the product demands of the buyer 42802. In the case of a cooperative settlement process between the buyer 42802 and vendor 42804, the vendor 42804 can send a ProductForecastRevisionNotification 42812 back to the buyer. The ProductForecastRevisionNotification 42812 is a revision of the product forecast that was sent by the buyer 42802. In turn, the buyer 42802 can respond with a ProductForecastRevisionNotification 42814, which is an updated revision.

(3) Message Data Type Product Activity Message

The message data type ProductActivityMessage groups the business information that is relevant for sending a business document in a message and the object ProductActivity included in the business document. As depicted in FIG. 429, the message data type ProductActivityMessage includes a ProductActivityMessage package 42902, which includes a MessageHeader package 42904 and a ProductActivity package 42906. The ProductActivityMessage package 42902 also includes a ProductActivityMessage entity 42908. The structure of the message data type ProductActivity is available for the message type ProductActivityNotification and the relevant interfaces.

(a) Message Header Package

A MessageHeader package 42904 groups the business information that is relevant for sending a business document in a message. It includes a MessageHeader entity 42910. There is a 1:1 relationship 42912 between the ProductActivityMessage entity 42908 and the MessageHeader entity 42910.

(i) Message Header

The MessageHeader groups the business information from the view of the sending application. The MessageHeader entity 42910 includes information to identify the business document in a message, information about the sender, and, possibly, information about the recipient.

The MessageHeader entity 42910 includes a SenderParty entity 42914 and a RecipientParty entity 42916. There is a 1:c relationship 42918 between the MessageHeader entity 42910 and the SenderParty entity 42914, and a 1:c relationship 42920 between the MessageHeader entity 42910 and the RecipientParty entity 42916. The MessageHeader entity 42910 is of type GDT: BusinessDocumentMessageHeader. The MessageHeader entity 42910 also includes an ID and a CreationDateTime. The ID is the identification of the business document in the technical message. The CreationDateTime is the creation date of the business document in the technical message.

(ii) Sender Party

The SenderParty is responsible for sending a business document at the business application level. The SenderParty entity 42914 is of type GDT: BusinessDocumentMessageHeaderParty.

(iii) Recipient Party

The RecipientParty is responsible for receiving a business document at the business application level. The RecipientParty entity 42916 is of type GDT: Bus inessDocumentMessageHeaderParty.

(b) Product Activity Package

The ProductActivity package 42906 groups the ProductActivity entity 42928 with its packages. It includes a Party package 42922, a BusinessTransactionDocumentReference package 42924, and a Product Activity Item package 42926. There is a 1:1 relationship 42930 between the ProductActivityMessage entity 42908 and the ProductActivity entity 42928.

ProductActivity includes information about the stock, demand, and consumption of products of a buyer (retailers, wholesalers, or manufacturers) at a ship-to location, and about the involved parties, for other relevant business documents and (optionally) for a ship-from location. The ProductActivity entity 42928 includes a ValidityPeriod and a Note. The ValidityPeriod is the validity period for the specifications transferred in the ProductActivityNotification, and is of type GDT: DateTimePeriod. The Note is a language-independent note, and is of type GDT:Note.

(c) Party Package

The Party Package 42922 includes the grouping of the business partners that may be relevant within the ProductActivityNotification. It includes a BuyerParty entity 42932 and a VendorParty entity 42934. There is a 1:c relationship 42936 between the ProductActivity entity 42928 and the BuyerParty entity 42932, and a 1:c relationship 42938 between the ProductActivity entity 42928 and the VendorParty entity 42934.

For an internal communication (with common master data), the InternalID for the party entities should be used. For an interenterprise communication (with business-partner-specific master data),either the StandardID or the partner-role-specific ID of the receiving partner should be used for the party entities. In other words, for Supplier Collaboration scenarios the BuyerID should be used, and for Customer Collaboration scenarios, the VendorID should be used. Due to the different possibilities for ID use, all ID elements of the particular "Party" are optional. In an internal scenario, it is not a requirement to enter the business partner in the message; both party entities are optional.

(i) Buyer Party

The BuyerParty is a company that buys goods. The BuyerParty entity 42932 is of type GDT:BusinessTransactionDocumentParty. Typically the InternalID, the StandardID, the BuyerID, and the VendorID should be used.

(ii) Vendor Party

The VendorParty is a company that delivers goods. The VendorParty entity 42934 is of type GDT:BusinessTransactionDocumentParty. Typically the InternalID, the StandardID, the BuyerID, and the VendorID should be used.

(d) Business Transaction Document Reference Package

The BusinessTransactionDocumentReference package 42924 is a grouping of references to business documents that may occur in the ProductActivityNotification. The BusinessTransactionDocumentReference package 42924 includes an InboundDeliveryReference entity 42940. There is a 1:cn relationship 42942 between the ProductActivity entity 42928 and the InboundDeliveryReference entity 42940.

The InboundDeliveryReference is the reference to an inbound delivery or an item within one. The InboundDeliveryReference entity 42940 is of type GDT:BusinessTransactionDocumentReference.

(e) Product Activity Item Package

The ProductActivityItem package 42926 groups the ProductActivityItem 42950 with its packages. It includes a Location package 42944, a ProductInformation package 42946, and an Inventory package 42948. There is a 1:n relationship 42952 between the ProductActivity entity 42928 and the ProductActivityItem entity 42950.

(i) Product Activity Item

The ProductActivityItem includes specifications about the stock, demand, and/or consumption of a product in reference to a ship-to location and (optionally) a ship-from location. The ProductActivityItem entity 42950 includes a SalesTimeSeries, a PromotionSalesTimeSeries, a SalesForecastTimeSeries, a PromotionSalesForecastTimeSeries, an OrderForecastTimeSeries, a PromotionOrderForecastTimeSeries, a ConsumptionTimeSeries, a ConsumptionForecastTimeSeries, an OnOrderTimeSeries, and an OutOfStock- TimeSeries. The SalesTimeSeries is the time series for the sale of products, and is of type GDT: QuantityTimeSeries, where the FixedIndicator is not used. The PromotionSalesTimeSeries is the time series for the promotional sale of products, and is of type GDT: QuantityTimeSeries, where the FixedIndicator is not used. The SalesForecastTimeSeries is the time series for the forecasted sale of products, and is of type GDT: QuantityTimeSeries, where the FixedIndicator is not used. The PromotionSalesForecastTimeSeries is the time series for the forecasted promotional sale of products, and is of type GDT: QuantityTimeSeries, where the FixedIndicator is not used. The OrderForecastTimeSeries is the time series for the forecasted purchase orders of products, and is of type GDT: QuantityTimeSeries, where the FixedIndicator is not used. The PromotionOrderForecastTimeSeries is the time series for the forecasted promotional purchase orders of products, and is of type GDT: QuantityTimeSeries, where the FixedIndicator is not used. The ConsumptionTimeSeries is the time series for the product consumption induced by production, and is of type GDT: QuantityTimeSeries, where the FixedIndicator is not used. The ConsumptionForecastTimeSeries is the time series for the forecasted product consumption induced by production, and is of type GDT: QuantityTimeSeries, where the FixedIndicator is not used. The OnOrderTimeSeries is the time series for the open purchase orders of products, and is of type GDT: QuantityTimeSeries, where the FixedIndicator is not used. The OutOfStockTimeSeries is the time series for gaps in the warehouse stock of products that are based on the current product demand, and is of type GDT: QuantityTimeSeries, where the FixedIndicator is not used.

(ii) Location Package

The Location Package 42944 includes a summary of the specifications on locations that may be relevant for the delivery of the product specified in a ProductActivityItem. It includes a ShipFromLocation entity 42954 and a ShipToLocation entity 42956. There is a 1:c relationship 42958 between the Item entity 42950 and the ShipFromLocation entity 42954, and a 1:c relationship 42960 between the Item entity 42950 and the ShipToLocation entity 42956.

For an internal communication (with common master data), the InternalID for location entities should be used. For a B2B communication (with business-partner-specific master data), either the StandardID or the partner-role-specific ID of the receiving partner should be used for location entities. In other words, for Supplier Collaboration scenarios, the BuyerID should be used, and for Customer Collaboration scenarios, the VendorID should be used. Due to the different possibilities for ID use, ID elements of the particular "location" are optional.

(a) Ship From Location

The ShipFromLocation is the place from where the product specified in the item of the ProductActivity is to be delivered. The ShipFromLocation entity 42954 is of type GDT: BusinessTransactionDocument ShipFromLocation. The InternalID, the StandardID, the BuyerID, and the VendorID in the ShipFromLocation entity 42954 should be used.

(b) Ship To Location

The ShipToLocation is the place to where the product specified in the item of the ProductActivitiy is to be delivered. The ShipToLocation entity 42956 is of type GDT: BusinessTransactionDocumentShipToLocation. The InternalID, the StandardID, the BuyerID, and the VendorID should be used in the ShipToLocation entity 42956.

(iii) Product Information Package

The ProductInformation package 42962 includes a summary of the information that characterizes a product in detail. It includes a Product entity 42962. There is a 1:1 relationship 42964 between the Item entity 42950 and the Product entity 42962.

The Product is a tangible good for which the buyer makes specifications for the stock, demands, and/or consumption in a ProductActivityNotification. The Product entity 42962 is of type GDT: BusinessTransactionDocumentProduct. The InternalID, the StandardID, the BuyerID, the VendorID, and PackageQuantity and DiscontinuationIndicator in the Product entity 42962 should be used. For an internal communication (with common master data), the InternalID should be used for all product entities. For an interenterprise communication (with partner-specific master data), either only the StandardID or the partner-role-specific ID of the receiving partner should be used for all product entities. In other words, for Supplier Collaboration scenarios, the BuyerID should be used, and for Customer Collaboration scenarios, the VendorID should be used. Due to the different possibilities for ID use, all ID elements of the particular product are optional. Generally, a product is either a tangible or intangible good, and is a part of the business activities of a company. It can be traded and contributes directly or indirectly to value added.

(iv) Inventory Package

The Inventory Package 42948 includes a summary of information about the warehouse stock of a product at a buyer. It includes an Inventory entity 42966 and a ConsignmentInventory entity 42968. There is a 1:c relationship 42970 between the Item entity 42950 and the Inventory entity 42966, and a 1:c relationship 42972 between the Item entity 42950 and the ConsignmentInventory entity 42968.

(a) Inventory

The Inventory identifies the warehouse stock of a product at a buyer. The Inventory entity 42966 includes a StatusDateTime, an UnrestrictedUseQuantity, a QualityInspectionQuantity, a BlockedQuantity, and a PromotionQuantity. The StatusDateTime is the date and time at which the warehouse stock was determined, and is of type GDT: InventoryStatusDateTime. The UnrestrictedUseQuantity is the quantity that has an unlimited use, and is of type GDT: Quantity. The QualityInspectionQuantity is the quantity intended for quality inspection, and is of type GDT: Quantity. The BlockedQuantity is the quantity that may not be used, and is of type GDT: Quantity. The PromotionQuantity is the quantity intended for promotional purposes, and is of type GDT: Quantity. The specified stock information shows absolute values, not difference values.

(b) Consignment Inventory

The ConsignmentInventory identifies the consignment store stock of a product, in other words, the part of the stock that remains the property of the vendor until it is procured (and paid for). The ConsignmentInventory entity 42968 includes a StatusDateTime, an UnrestrictedUseQuantity, a QualityInspectionQuantity, a BlockedQuantity, and a PromotionQuantity. The StatusDateTime is the date and time at which the goods receipt is posted into the warehouse stock, and is of type GDT: InventoryStatusDateTime. The UnrestrictedUseQuantity is the quantity that has an unlimited use, and is of type GDT: Quantity. The QualityInspectionQuantity is the quantity intended for quality inspection, and is of type GDT: Quantity. The BlockedQuantity is the quantity that may not be used, and is of type GDT: Quantity. The PromotionQuantity is the quantity intended for promotional purposes, and is of type GDT: Quantity. The specified stock information shows absolute values, not difference values.

(4) Element Structure of Product Activity Message

FIGS. 430A-L depict the element structure for a ProductActivityNotification. The element structure is similar to the above described data model of the message data type ProductActivity Message as reflected in FIG. 429, but provides additional information regarding the details for interfacing with or implementing a ProductActivity Message, such as a ProductActivityNotification. As shown in FIG. 430, the element structure identifies the different packages 43000 that may be in a respective ProductActivityNotification. The element structure for the ProductActivityNotification includes six levels 43002, 43004, 43006, 43008, 43010, and 43012 each of which is associated with a respective package 43000. The element structure identifies the cardinality or occurrence 43014 and the data type 43016 information for the elements at the respective levels 43002, 43004, 43006, 43008, 43010, and 43012 in the respective package 43000.

The outermost package of this interface is a ProductActivityMessage package 43026, which includes a ProductActivityMessage entity 43028 at the first level 43002. The ProductActivityMessage entity 43028 is of type GDT: ProductActivityMessage 43030. The ProductActivityMessage package 43026 includes a MessageHeader package 43036 and a ProductActivity package 43038.

The MessageHeader package 43036 includes a MessageHeader entity 43040, which is of type BusinessDocumenMessageHeader 43044. There is one 43042 MessageHeader entity 43040 for each ProductActivityMessage entity 43028. The MessageHeader entity 43040 includes an ID 43052, a CreationDateTime 43064, a SenderParty entity 43072, and a RecipientParty entity 43002A. The ID 43052 is of type BusinessDocumentMessageID 43056, and there is one 43054 ID 43052 for each MessageHeader entity 43040. The CreationDateTime 43064 is of type DateTime 43068, and there is one 43066 CreationDateTime 43064 for each MessageHeader entity 43040. The SenderParty entity 43072 is of type BusinessDocumentMessageHeaderParty 43076, and there is zero or one 43074 SenderParty entity 43072 for each MessageHeader entity 43040. The RecipientParty entity 43002A is of type BusinessDocumentMessageHeaderParty 43006A, and there is zero or one 43004A RecipientParty entity 43002A for each MessageHeader entity 43040.

The SenderParty entity 43072 includes an InternalID 43084 and a Standard ID 43092. The InternalID 43084 is of type PartyInternalID 43088, and there is zero or one 43086 InternalID 43084 for each SenderParty entity 43072. The StandardID 43092 is of type PartyStandardID 43096, and there is any number 43094 of StandardID 43092 for each SenderParty entity 43072.

The RecipientParty entity 43002A includes an InternalID 43014A and a Standard ID 43022A. The InternalID 43014A is of type PartyInternalID 43018A, and there is zero or one 43016A InternalID 43014A for each RecipientParty entity 43002A. The StandardID 43022A is of type PartyStandardID 43026A, and there is any number 43024A of StandardID 43022A for each RecipientParty entity 43002A.

The ProductActivity Package 43038 includes a ProductActivity entity 43032A of type ProductActivity 43036A. There is one 43034A ProductActivity entity 43032A for each ProductActivityMessage entity 43028. The ProductActivity entity 43032A includes a ValidityPeriod 43040A of DateTimePeriod 43044A. There is one or zero 43042A ValidityPeriod 43040A for each ProductActivity entity 43032A. The ValidityPeriod 43040A includes a StartDateTime 43052A of type DateTime 43056A and an EndDateTime 43062A of type DateTime 43066A. For each ProductActivity entity 43032A, there is one or zero 43054A StartDateTime 43052A and one or zero 43064A EndDateTime 43062A.

The ProductActivity Package 43038 also includes a Party package 43072A, a BusinessTransactionDocumentRequest package 43074A, an Item package 43076A, and a Note 43002C. The Note 43002C is of type Note 43006C. There is one or zero 43004C Note 43002C for each ProductActivity entity 43032A.

The Party package 43072A includes a BuyerParty entity 43078A and a VendorParty entity 43036B. The BuyerParty 43078A is of type BusinessTransactionDocumentParty 43082A. There is one or zero 43080A BuyerParty entity 43078A for each ProductActivity entity 43032A. The VendorParty entity 43036B is of type BusinessTransactionDocumentParty 43040B. There is one 43038B VendorParty entity 43036B for each ProductActivity entity 43032A.

The BuyerParty entity 43078A includes an InternalID 43090A, a StandardID 43000B, a BuyerID 43012B, and a VendorID 43024B. The InternalID 43090A is of type PartyInternalID 43094A. The StandardID 43086A is of type PartyStandardID 43004B. The BuyerID 43096A is of type PartyPartyID 43016B. The VendorID 43006B is of type PartyPartyID 43028B. In one implementation, for each ProductActivity entity 43032A, there is one or zero 43092A InternalID 43090A, any number 43092A of StandardIDs 43000B, one or zero 43014B BuyerID 43012B, and one or zero 43026B VendorID 43024B.

The VendorParty entity 43036B includes an InternalID 43048B, a StandardID 43058B, a BuyerID 43070B, and a VendorID 43082B. The InternalID 43048B is of type PartyInternalID 43052B. The StandardID 43058B is of type PartyStandardID 43062B. The BuyerID 43070B is of type PartyPartyID 43074B. The VendorID 43082B is of type PartyPartyID 43086B. In one implementation, for each ProductActivity entity 43032A, there is one or zero 43050B InternalID 43048B, any number 43060B of StandardIDs 43058B, one or zero 43072B BuyerID 43070B, and one or zero 43084B VendorID 43082B.

The BusinessTransactionDocumentRequest package 43074A includes an InboundDeliveryReference entity 43094B of type BusinessTransactionDocumentReference 43098B. There is any number 43096B of InboundDeliveryReference entities 43094B for each ProductActivity entity 43032A.

The Item package 43076A includes an Item entity 43012C of type ProductActivityItem 43016C. There is one or more 43004C of Item entities 43012C for each ProductActivity entity 43032A. The Item package 43076A also includes a Location package 43022C, a ProductInformation package 42924C, and an Inventory package 42926C.

The Location package 43022C includes a ShipFromLocation entity 43028C and a ShipToLocation entity 43086C. The ShipFromLocation entity 43028C is of type BusinessTransactionDocument ShipFromLocation 43032C. There is one or zero 43030C ShipFromLocation entity 43028C for each Item entity 43012C. The ShipToLocation entity 43086C is of type BusinessTransactionDocumentLocation 43090C. There is one 43088C ShipToLocation entity 43086C for each Item entity 43012C.

The ShipFromLocation entity 43028C includes an InternalID 43040C, a StandardID 43050C, a BuyerID 43062C, and a VendorID 43074C. The InternalID 43040C is of type LocationInternalID 43044C. The StandardID 43050C is of type of LocationStandardID 43054C. The BuyerID 43062C is of type LocationPartyID 43066C. The VendorID 43074C is of type LocationPartyID 43078C. In one implementation, for each ShipFromLocation entity 43028C, there is one or zero 43042C InternalID 43040C, one or zero 43052C StandardID

43050C, one or zero 43064C BuyerID 43062C, and one or zero 43076C VendorID 43074C.

The ShipToLocation entity 43086C includes an InternalID 43098C, a StandardID 43008D, a BuyerID 43020D, and a VendorID 43032D. The InternalID 43098C is of type LocationInternalID 43002D. The StandardID 43008D is of type of LocationStandardID 43012D. The BuyerID 43020D is of type LocationPartyID 43024D. The VendorID 43032D is of type LocationPartyID 43036D. In one implementation, for each ShipFromLocation entity 43028C, there is one or zero 43000D InternalID 43098C, one or zero 43010D StandardID 43008D, one or zero 43022D BuyerID 43020D, and one or zero 43034D VendorID 43032D.

The ProductInformation package 43024C includes a Product entity 43044D of type BusinessTransactionDocumentProduct 43048D. There is one 46D Product entity 43044D for each Item entity 43012C.

The Product entity 43044D includes an InternalID 43056D, a StandardID 43066D, a BuyerID 43078D, a VendorID 43090D, a PackageQuantity 43002E, and a DiscontinuationIndicator 43012E. The InternalID 43056D is of type ProductInternalID 43060D. The StandardID 43066D is of type of ProductStandardID 43070D. The BuyerID 43078D is of type ProductPartyID 43082D. The VendorID 43090D is of type ProductPartyID 43094D. The PackageQuantity 43002E is of type Quantity 43006E. The DiscontinuationIndicator 43012E is of type ProductDiscontinuationIndicator 43016E. In one implementation, for each Product entity 43044D, there is one or zero 43058D InternalID 43056D, one or zero 43068D StandardID 43066D, one or zero 43080D BuyerID 43078D, one or zero 43092D VendorID 43090D, one or zero 43004E PackageQuantity 43002E, and one or zero 43014E DiscontinuationIndicator 43012E.

The Inventory package 42926C includes an Inventory entity 43020E of type ProductActivityItemInventory 43024E and a ConsignmentInventory entity 43082E of type ProductActivityItemInventory 43086E. There is one or zero 43022D Inventory entity 43020E for each Item entity 43012C and one or zero 43022D ConsignmentInventory entity 43082E for each Item entity 43012C.

The Inventory entity 43020E includes a StatusDateTime 43030E of type DateTime 43034E, an UnrestrictedUseQuantity 43040E of type Quantity 43044E, a QualityInspectionQuantity 43052E of type Quantity 43056E, a BlockedQuantity 43062E of type Quantity 43066E, and a PromotionQuantity 43072E of type Quantity 43076E. In one implementation, for each Inventory entity 43020E, there is one or zero 43032E StatusDateTime 43030E, one or zero 43042E UnrestrictedUseQuantity 43040E, one or zero 43054E QualityInspectionQuantity 43052E, one or zero 43064E BlockedQuantity 43062E, and one or zero 43072E PromotionQuantity 43072E.

The ConsignmentInventory entity 43082E includes a StatusDateTime 43090E of type DateTime 43094E, an UnrestrictedUseQuantity 43098E of type Quantity 43002F, a QualityInspectionQuantity 43008F of type Quantity 43012F, a BlockedQuantity 43018E of type Quantity 43022F, and a PromotionQuantity 43028F of type Quantity 43032F. In one implementation, for each ConsignmentInventory entity 43082E, there is one or zero 43092E StatusDateTime 43090E, one or zero 43000F UnrestrictedUseQuantity 43098E, one or zero 43010F QualityInspectionQuantity 43008F, one or zero 43020E BlockedQuantity 43018E, and one or zero 43030F PromotionQuantity 43028F.

The Item entity 43012C includes a SalesTimeSeries 43038F, a PromotionSalesTimeSeries 43076F, a SalesForecastTimeSeries 43008G, a PromotionSalesForecastTimeSeries 43040G, an OrderForecastTimeSeries 43072G, a PromotionOrderForecastTimeSeries 43010H, a ConsumptionTimeSeries 43042H, a ConsumptionForecastTimeSeries 43074H, an OnOrderTimeSeries 43006I, and an OutofStockTimeSeries 43038I. The SalesTimeSeries 43038F is of type QuantityTimeSeries 43042F. The PromotionSalesTimeSeries 43076F is of type QuantityTimeSeries 43080F. The SalesForecastTimeSeries 43008G is of type QuantityTimeSeries 43012G. The PromotionSalesForecastTimeSeries 43040G is of type QuantityTimeSeries 43044G. The OrderForecastTimeSeries 43072G is of type QuantityTimeSeries 43076G. The PromotionOrderForecastTimeSeries 43010H is of type QuantityTimeSeries 43014H. The ConsumptionTimeSeries 43042H is of type QuantityTimeSeries 43046H. The ConsumptionForecastTimeSeries 43074H is of type QuantityTimeSeries 43078H. The OnOrderTimeSeries 43006I is of type QuantityTimeSeries 43010I. The OutofStockTimeSeries 43038I is of type QuantityTimeSeries 43042I. In one implementation, for each Item entity 43012C, there is one or zero 43040F SalesTimeSeries 43038F, one or zero 43078F PromotionSalesTimeSeries 43076F, one or zero 43010G SalesForecastTimeSeries 43008G, one or zero 43042G PromotionSalesForecastTimeSeries 43040G, one or zero 43074G OrderForecastTimeSeries 43072G, one or zero 43012H PromotionOrderForecastTimeSeries 43010H, one or zero 43044H ConsumptionTimeSeries 43042H, one or zero 43076H ConsumptionForecastTimeSeries 43074H, one or zero 43008I OnOrderTimeSeries 43006I, and one or zero 43040I OutofStockTimeSeries 43038I.

The SalesTimeSeries 43038F includes any number 43050F of SalesTimeSeries Items 43048F. Each SalesTimeSeries Item 43048F includes one 43058F ValidityPeriod 43056F of type DateTimePeriod 43060F and one 43068F Quantity 43066F of type Quantity 43070F.

The PromotionSalesTimeSeries 43076F includes any number 43078F of PromotionSalesTimeSeries Items 43086F. Each PromotionSalesTimeSeries Item 43086F includes one 43094F ValidityPeriod 43092F of type DateTimePeriod 43098F and one 43000G Quantity 43000G of type Quantity 43004G.

The SalesForecastTimeSeries 43008G includes any number 43020G of SalesForecastTimeSeries Items 43018G. Each SalesForecastTimeSeries Item 43018G includes one 43026G ValidityPeriod 43024G of type DateTimePeriod 43028G and one 43034G Quantity 43032G of type Quantity 43036G.

The PromotionSalesForecastTimeSeries 43040G includes any number 43052G of PromotionSalesForecastTimeSeries Items 43050G. Each PromotionSalesForecastTimeSeries Item 43050G includes one 43058G ValidityPeriod 43056G of type DateTimePeriod 43060G and one 43066G Quantity 43064G of type Quantity 43068G.

The OrderForecastTimeSeries 43072G includes any number 43084G of OrderForecastTimeSeries Items 43082G. Each OrderForecastTimeSeries Item 43082G includes one 43092G ValidityPeriod 43090G of type DateTimePeriod 43094G and one 43002H Quantity 43000H of type Quantity 43004H.

The PromotionOrderForecastTimeSeries 43010H includes any number 43022H of PromotionOrderForecastTimeSeries Items 43020H. Each PromotionOrderForecastTimeSeries Item 43020H includes one 43028H ValidityPeriod 43026H of type DateTimePeriod 43030H and one 43036H Quantity 43034H of type Quantity 43038H.

The ConsumptionTimeSeries 43042H includes any number 43054H of ConsumptionTimeSeries Items 43052H. Each ConsumptionTimeSeries Item 43052H includes one 43060H ValidityPeriod 43058H of type DateTimePeriod 43062H and one 43068H Quantity 43066H of type Quantity 43070H.

The ConsumptionForecastTimeSeries 43074H includes any number 43086H of ConsumptionForecastTimeSeries Items 43084H. Each ConsumptionForecastTimeSeries Item 43084H includes one 43092H ValidityPeriod 43090H of type DateTimePeriod 43094H and one 43000I Quantity 43098H of type Quantity 43002H.

The OnOrderTimeSeries 43006I includes any number 43018I of OnOrderTimeSeries Items 43016I. Each OnOrderTimeSeries Item 43016I includes one 43024I ValidityPeriod 43022I of type DateTimePeriod 43026I and one 43032I Quantity 43030I of type Quantity 43034I.

The OutofStockTimeSeries 43038I includes any number 43050I of OutofStockTimeSeries Items 43048I. Each OutofStockTimeSeries Item 43048I includes one 43058I ValidityPeriod 43056I of type DateTimePeriod 43060I and one 43068I Quantity 43066I of type Quantity 43070I.

w) Payment Due Interface

FIG. 431 depicts the message choreography for Payment Due Notification between to business entities, Invoice/Billing 43102 and Payment 43104.

The motivating business scenarios for the Payment Due Notification are the Procure to Stock and Sell from Stock (SFS) scenarios. After an incoming invoice is checked in BAC Invoicing, a message is sent to BAC Payment, generating an open payable there and thus triggering the subsequent payment process. Similarly, when a billing document is sent in BAC Billing, a message is sent to BAC Payment, generating an open receivable item there and thus enabling the assignment of incoming payments.

(1) Message Type Payment Due Notification

A PaymentDueNotification 43106 notifies an application (payment register), in which subsequent operative processing of payments takes place, about due dates (accounts receivable and accounts payable) of business partners. The message type PaymentDueNotification 43106 is based on the message data type PaymentDueMessage 43200, which is disclosed more fully in FIG. 432.

The PaymentDueNotification 43106 is used for checking an incoming invoice, creating an outgoing invoice, checking an incoming credit memo, and creating an outgoing credit memo. On receipt of a due date (accounts receivable and accounts payable) in the payment register, one or more open due date items are generated. These open items form the basis for the following process steps: (1) Clearing a business partner's receivables and payables; (2) A bank's payment orders; (3) Payment collections; (4) Assigning an incoming payment (account statement) to a receivable; (5) Dunning notices/reminders; and (6) Dispute management.

The creation and checking of an incoming invoice in Invoicing 43102 is independent of the processing of payables for payment in Payment 43104. Payables are also generated from credit memos for outgoing invoices (billing documents). Receivables are generated through the shipment of a billing document in Billing 43102 or a credit memo in Invoicing 43102. If the invoice is incorrect, for instance wrong amounts, a new invoice or credit memo is generally generated by Billing 43102 or received by Invoicing 43102 to correct the error. The sequence of messages sent to Payment 43104 is irrelevant for Payment 43104. If a reverse function is implemented in Invoicing 43102 or Billing 43102, for example to let the accounting clerk reverse an incorrect entry in an incoming invoice, this reversal can be notified to Payment 43104 with the PaymentDueCancelNotification 43108 message. This message is then processed by Payment 43104 after the related PaymentDueNotification 43106. As this is not a typical situation, serialization is not required. The reversal function and the PaymentDueCancelNotification 43108 message are not planned to be implemented initially; serialization can be avoided by tolerant coding in Payment 43104.

(2) Message Data Type Data Model

The complete data model for the Payment Due Notification is depicted in FIG. 432. The message data type PaymentDueMessage 43200 includes the PaymentDue Message entity 43202 included in the business document and the business information that is relevant for sending a business document in a message. The message data type PaymentDueMessage 43200 also includes a MessageHeader package 43204, and a PaymentDue package 43206. The message data type PaymentDueMessage 43200 makes the structure available for the message type PaymentDue and the relevant interfaces.

(a) Message Header Package

A MessageHeader package 43204 groups together the business information that is relevant for sending a business document in a message. The MessageHeader 43204 is not required for PaymentDueNotification 43106. An invoice or credit memo is transferred to Payment 43104 once. A message ID is not required since the reference can always be established with the ID of the invoice or credit memo. At most, the sender is known as the "system ID." The recipient is not known; Invoice and Billing 43102 only know that this message is to be sent to the Payment 43104 application that is responsible for the payment process for the payment sender and payment recipient.

(b) Payment Due Package

The PaymentDue package 43206 groups together all the information that is required to generate due dates in a payment register. It includes a Payment Due entity 43208, a Party package 43210, a BusinessTransactionDocumentReference package 43212, and an Item package 43214.

(i) Payment Due Entity

PaymentDue entity 43208 indicates the type of due payments (for payment or expected) and their amounts. There is a 1:1 relationship 43209 between the PaymentDue entity 43208 and PaymentDueMessage 43202. For each invoice or credit memo that is uniquely identified as the base business document, PaymentDue entity 43208 receives one or more due date item (PaymentDueItems 43216; see below) with details of the type and amount of the payment due, the payment terms and the business partners involved.

PaymentDue 43208 includes a BaseBusinessTransactionDocumentID, a BaseBusinessTransactionDocumentTypeCode, and a BaseBusinessTransactionDocumentDate. The BaseBusinessTransactionDocumentID is the identification of the business document or source document on which the due date is based, and is of type GDT: BusinessTransactionDocumentID. The BaseBusinessTransactionDocumentTypeCode is the coded representation of the previously named business document or source document. Invoice and VendorInvoice are to be considered here. The BaseBusinessTransactionDocumentTypeCode is of type GDT: BusinessTransactionDocumentTypeCode. The BaseBusinessTransactionDocumentDate is the date of the business document or source document on which the due date is based, and is of type GDT: Date.

(ii) Party Package

The Party package 43210 is a grouping of all business parties that may be involved in a due payment. It includes a PayerParty entity 43218, a PayeeParty entity 43220, a DebtorParty entity 43222, and a CreditorParty entity 43224. Default logic is used for all business partners: business partners who are specified at header level are used for all the items for which a corresponding partner is not explicitly transferred.

(a) Payer Party Entity

PayerParty entity 43218 (payment sender or payer) is a company or a person that pays for goods or services. PayerParty entity 43218 is of type GDT: BusinessTransactionDocumentParty, but only includes the InternalID element. There is a 1:1 relationship 43219 between PaymentDue entity 43208 and PayerParty entity 43218. No other elements are required since the master data exists in the sender and receiver system to be able to operate correctly. PayerParty entity 43218 is always filled. The payment sender is always mapped in this business partner role. The role of PayerParty entity 43218 is known to CRM Billing (payer); in SRM Invoice Verification the payer party is the buying company (BuyerParty).

(b) Payee Party Entity

PayeeParty entity 43220 (payee) is a company or a person that receives payment for goods or services. PayeeParty entity 43220 is of type GDT: BusinessTransactionDocumentParty, but only includes the InternalID element. There is a 1:1 relationship 43221 between PaymentDue entity 43208 and PayeeParty entity 43220. No other elements are required since the master data exists in the sender and receiver system to be able to operate correctly. PayeeParty entity 43220 is always filled. The payee is always mapped in this business partner role. The role of payee is known to SRM; in CRM Billing the payee is the billing unit.

(c) Debtor Party Entity

DebtorParty entity 43222 (customer, debtor) is the owner of payables. DebtorParty entity 43222 is of type GDT: BusinessTransactionDocumentParty, but only includes the InternalID element. There is a 1:c relationship 43223 between PaymentDue entity 43208 and DebtorParty entity 43222. No other elements are required since the master data exists in the sender and receiver system to be able to operate correctly. One does not have to specify DebtorParty 43222. If DebtorParty entity 43222 is not filled, the payment sender (payer, BillFromParty) and DebtorParty entity 43222 (debtor) are identical. For an incoming invoice or credit memo, the buying company (BuyerParty) is mapped in this business partner role if it is different from the payment sender. For an outgoing invoice or credit memo, the sold-to party is mapped in this business partner role if it is different from the payment sender.

(d) Creditor Party Entity

CreditorParty entity 43224 (vendor, creditor) is the owner of the receivables. CreditorParty entity 43224 is of type GDT: BusinessTransactionDocumentParty, but only includes the InternalID element. There is a 1:c relationship 43225 between PaymentDue entity 43208 and CreditorParty entity 43224. No other elements are required since the master data exists in the sender and receiver system to be able to operate correctly. One does not have to specify CreditorParty entity 43224. If CreditorParty entity 43224 is not specified, the payee and CreditorParty 43224 (vendor) are identical. For an incoming invoice or credit memo, the vendor is mapped in this business partner role if the vendor is different from the payee. For an outgoing invoice or credit memo, the billing unit is mapped in this business partner role if the billing unit is different from the payee.

(iii) Business Transaction Document Reference Package

The BusinessTransactionDocumentReference package 43212 groups all the references to business documents on which the due payments are based. It includes an OriginInvoiceReference entity 43226, an OriginVendorInvoiceReference entity 43228, and an InvoiceReference entity 43230.

(a) Origin Invoice Reference Entity

OriginInvoiceReference entity 43226 is the reference to an outgoing invoice for which the business document or primary entry on which the current due date is based is a follow-up document. OriginInvoiceReference entity 43226 is of type GDT: BusinessTransactionDocumentParty, but only includes the Element ID. There is a 1:c relationship 43227 between PaymentDue entity 43208 and OriginInvoiceReference entity 43226. The ItemID element is not required since reference is made to the document and not to an item. OriginInvoiceReference entity 43226 is only filled if the document on which the current due date is based (BaseBusinessTransactionDocument) is a follow-on document to an outgoing invoice. An OriginInvoiceReference entity 43226 may be the original invoice number of a current credit memo.

(b) Origin Vendor Invoice Reference Entity

OriginVendorInvoiceReference entity 43228 is the reference to an incoming invoice for which the business document or primary entry on which the current due date is based is a follow-up document. OriginVendorInvoiceReference entity 43228 is of type GDT: BusinessTransactionDocumentReference, but only includes the Element ID. There is a 1:c relationship 43229 between PaymentDue entity 43208 and Origin Vendor Invoice Reference entity 43228. The ItemID element is not required since reference is made to the document and not to an item. OriginVendorInvoiceReference entity 43228 is only filled if the document on which the current due date is based (BaseBusinessTransactionDocument) is a follow-on document to an incoming invoice. An OriginVendorInvoiceReference entity 43228 may be the original invoice number of a current credit memo.

(c) Invoice Reference Entity

InvoiceReference entity 43230 is the reference to the invoice of the invoicing party. InvoiceReference 43230 is of type GDT: BusinessTransactionDocumentReference, but only includes the Element ID. There is a 1:c relationship 43231 between PaymentDue entity 43208 and Invoice Reference entity 43230. The ItemID element is not required since reference is made to the document and not to an item. For incoming invoices, InvoiceReference entity 43230 is filled since the payment refers to this information. For incoming invoices, the ID of the incoming invoice (VendorInvoice) assigned by Invoicing is used in BaseBusinessTransactionDocumentID and not the ID of the invoice assigned by the invoicing party. For outgoing invoices, the payment references the invoice number included in this case in BaseBusinessTransactionDocumentID, and InvoiceReference entity 43230 need not be filled.

(iv) Payment Due Item Package

The PaymentDueItem package 43214 is a grouping of all information on a single due date item (receivable or payable). It includes a PaymentDueItem entity 43216, a PaymentInformation package 43232 and a Party package 43224.

(a) Payment Due Item Entity

PaymentDueItem entity 43216 describes a due date item (receivable or payable). A PaymentDueItem entity 43216 can contain additional details on payment terms and participating business partners as well as the type and amount of payment due. PaymentDueItem entity 43216 includes an Amount, a PaymentCurrency, a FixedExchangeRate, and a Group ID. The Amount is the amount to be paid in transaction currency (invoice currency). Incoming invoices and credit memos (document type "I01 VendorInvoice") are treated as payables, in other words a positive amount means increased payables and a negative amount means decreased payables. Outgoing invoices and credit memos (document type "I02 Invoice") are treated as receivables, in other words a positive amount means increased receivables and a negative amount means decreased receivables. The Amount is of type GDT: Amount. The PaymentCurrency is the payment currency, if it is different from the transaction currency, and is of type GDT: CurrencyCode. The FixedExchangeRate is used if a fixed exchange rate has been specified for payments in different currencies. The FixedExchangeRate is of type GDT: ExchangeRate. The Group ID is the payment grouping that groups multiple due date items from different PaymentDueNotifications into one payments (if this grouping is to be determined by Invoicing or Billing), and is of type GDT: BusinessTransactionDocumentItemGroupID. There is a 1:n relationship 43215 between PaymentDue entity 43208 and PaymentDueItem entity 43216.

(b) Payment Information Package

The PaymentInformation package 43232 is a grouping of all payment methods on a due date item. It includes a CashDiscountTerms entity 43236, which includes the payment conditions, and a PaymentForm entity 43238, which is the payment form.

(i) Cash Discount Terms Entity

CashDiscountTerms entity 43236 includes the payment conditions of the due date item. CashDiscountTerms entity 43236 is of type GDT: CashDiscountTerms. There is a 1:1 relationship 43237 between PaymentDueItem entity 43216 and CashDiscountTerms entity 43236. CashDiscountTerms entity 43236 is always specified. The PaymentBaselineDate element is mandatory.

(ii) Payment Form Entity

PaymentForm entity 43238 is the way in which due date items are paid. This includes credit card details as well as the actual form of payment (invoice, collection, credit card, . . . ). PaymentForm entity 43238 is of type GDT: PaymentForm. There is a 1:c relationship 43239 between PaymentDueItem entity 43216 and PaymentForm entity 43238. If PaymentForm entity 43238 is not specified, the payment form stored in the master data of the business partner applies.

(c) Party Package

The Party package 43234 is a grouping of all business parties that may be involved in the due payment of an item. It includes a PayerParty entity 43240 and a PayeeParty entity 43242. The PaymentDueItemParty package 43234 is optional and overrides the header details.

(i) Payer Party Entity

PayerParty entity 43240 is the party who pays for the due items. PayerParty entity 43240 is of type GDT: BusinessTransactionDocumentParty. There is a 1:c relationship 43241 between PaymentDueItem entity 43216 and PayerParty entity 43240. PayerParty entity 43240 includes an InternalID, which is of type GDT:PartyID.

(ii) Payee Party Entity

PayeeParty entity 43242 is the party who receives payment for the due items. PayeeParty entity 43242 is of type GDT: BusinessTransactionDocumentParty. There is a 1:c relationship 43243 between PaymentDueItem entity 43216 and PayeeParty entity 43242.

(3) Message Data Type Element Structure

FIG. 433 depicts the element structure for Payment Due Notification. The element structure is similar to the data model, but provides additional information regarding the details of the interface. The element structure identifies the different packages 43300 in the interface, and represents the entities at various levels within the interface. As depicted in FIG. 433, the interface for Payment Due Notification includes five levels 43302, 43304, 43306, 43308, and 43310. The outermost package of this interface is a PaymentDueMessage package 43320, which includes a PaymentDueMessage entity 43322 at the first level 43302. The PaymentDueMessage entity 43322 is of type message data type ("MDT") 43324 "PaymentDueMessage" 43326.

Referring to FIG. 433, the PaymentDueMessage package 43320 includes a PaymentDue package 43328. The PaymentDue package 43328 includes a PaymentDue entity 43330 at the second level 43304 and the following packages: a Party package 43362, a BusinessTransactionDocumentReference 43364, and an Item package 43366.

The PaymentDue entity 43330 is of type AGDT 43334 "PaymentDue" 43336. There is one 43332 PaymentDue entity 43330 for each PaymentDue package 43328.

The PaymentDue entity 43330 includes a BaseBusinessTransactionDocumentID entity 43338, a BaseBusinessTransactionDocumentCode entity 43346, and a BaseBusinessTransactionDocumentDate entity 43354 at the third level 43306. The BaseBusinessTransactionDocumentID entity 43338 is of type BGDT 43342 "BaseBusinessTransactionDocumentID" 43344. There is one 43340 BaseBusinessTransactionDocumentID entity 43338 for each PaymentDue entity 43330. The BaseBusinessTransactionDocumentCode entity 43346 is of type BGDT 43350 "BaseBusinessTransactionDocumentCode" entity 43352. There is one 43348 BaseBusinessTransactionDocumentCode entity 43346 for each PaymentDue entity 43330. The BaseBusinessTransactionDocumentDate entity 43354 is of type BGDT 43358 "Date" 43360. There is one 43356 BaseBusinessTransactionDocumentDate entity 43354 for each PaymentDue entity 43330.

Referring to FIG. 433, Party package 43362 includes four entities at the third level 43306: a PayerParty entity 43368, a PayeeParty entity 43384, a DebtorParty entity 43300A, and a CreditorParty entity 43316A. PayerParty entity 43368 is of the type AGDT 43372, "BusinessTransactionDocumentParty" 43374. There is one 43370 PayerParty entity 43368 for each Party package 43362. PayerParty entity 43368 includes an InternalID entity 43376 at the fourth level 43308. The InternalID entity 43376 is of the type BGDT 43380 "PartyID" 43382. There is one 43378 InternalID entity 43376 for each PayerParty entity 43368.

The PayeeParty entity 43384 is of the type AGDT 43388, "BusinessTransactionDocumentParty" 43390. There is one 43386 PayeeParty entity 43384 for each Party package 43362. PayeeParty entity 43384 includes an InternalID entity 43392 at the fourth level 43308. The InternalID entity 43392 is of the type BGDT 43396 "PartyID" 43398. There is one 43394 InternalID entity 43392 for each PayeeParty entity 43384.

The DebtorParty entity 43300A is of the type AGDT 43304A, "BusinessTransactionDocumentParty" 43306A. There is zero or one 43302A DebtorParty entity 43300A for each Party package 43362. DebtorParty entity 43300A includes an InternalID entity 43308A at the fourth level 43208. The InternalID entity 43308A is of the type BGDT 43312A "PartyID" 43314A. There is one 43310A InternalID entity 43308A for each DebtorParty entity 43300A.

The CreditorParty entity 43316A is of the type AGDT 43320A, "BusinessTransactionDocumentParty" 43322A. There is zero or one 43318A CreditorParty entity 43316A for each Party package 43362. CreditorParty entity 43316A includes an InternalID entity 43324A at the fourth level 43308. The InternalID entity 43324A is of the type BGDT 43328A "PartyID" 43330A. There is one 43326A InternalID entity 43324A for each CreditorParty 43316A.

Referring to FIG. 433, the BusinessTransactionDocumentReference package 43364 includes an OriginInvoiceReference entity 43332A, an OriginVendorInvoiceReference entity 43348A, and an InvoiceReference entity 43364A at the third level 43306.

The OriginInvoiceReference entity 43332A is of the type AGDT 43336A, "BusinessTransactionDocumentReference" 43338A. There is zero or one 43334A OriginInvoiceReference entity 43332A for each BusinessTransactionDocumentReference package 43364. OriginInvoiceReference entity 43332A includes an ID entity 43340A at the fourth level 43308. The ID entity 43340A is of the type BGDT 43344A "BusinessTransactionDocumentID" 43346A. There is one 43342A ID entity 43340A for each OriginInvoiceReference entity 43332A.

The OriginVendorInvoiceReference entity 43348A is of the type AGDT 43352A, "BusinessTransactionDocumentReference" 43354A. There is zero or one 43350A OriginVendorInvoiceReference entity 43348A for each BusinessTransactionDocumentReference package 43364. OriginVendorInvoiceReference entity 43348A includes an ID entity 43356A at the fourth level 43308. The ID entity 43356A is of the type BGDT 43360A "BusinessTransactionDocumentID" 43362A. There is one 43358A ID entity 43356A for each OriginVendorInvoiceReference entity 43348A.

The InvoiceReference entity 43364A is of the type AGDT 43368A, "BusinessTransactionDocumentReference" 43370A. There is zero or one 43366A InvoiceReference entity 43364A for each BusinessTransactionDocumentReference package 43364. InvoiceReference entity 43364A includes an ID entity 43372A at the fourth level 43308. The ID entity 43372A is of the type BGDT 43376A "BusinessTransactionDocumentID" 43378A. There is one 43374A ID entity 43372A for each InvoiceReference entity 43364A.

Referring to FIG. 433, the Item package 43366 includes an Item entity 43380A at the third level 43306 and two packages: a PaymentInformation package 43320B and a Party package 43322B.

The Item entity 43380A is of the type AGDT 43384A "PaymentDueItem" 43386A. There is at least one 43382A Item entity 43380A for each Item package 43366.

The Item entity 43380A includes an Amount entity 43388A, a Payment Currency entity 43396A, a Fixed Exchange Rate entity 43304B, and a GroupID entity 43312B at the fourth level 43308. The Amount entity 43388A is of the type BGDT 43392A "Amount" 43394A. There is one 43390A Amount entity 43388A for each Item entity 43380A. The Payment Currenty entity 43396A is of the type BGDT 43300B "CurrencyCode" 43302B. There is zero or one 43398A PaymentCurrency entity 43396A for each Item entity 43380A. The Fixed Exchange Rate entity 43304B is of the type AGDT 43308B "ExchangeRate" 43310B. There is zero or one 43306B FixedExchangeRate entity 43304B for each Item entity 43380A. The GroupID entity 43312B is of the type BGDT 43316B "BusinessTransactionDocumentItemGroupID" 43318B. There is zero or one 43314B GroupID entity 43312B for each Item entity 43380A.

Referring to FIG. 433, the PaymentInformation package 43320B includes a CashDiscountTerms entity 43324B and a PaymentFormCode 43332B at the fourth level 43308. The CashDiscountTerms entity 43324B is of a type AGDT 43328B "CashDiscountTerms" 43330B. There is one 43326B CashDiscountTerms entity 43324B for each PaymentInformation package 43320B. The PaymentFormCode 43332B is of a type AGDT 43336B "PaymentFormCode" 43338B. There is zero or one 43334B PaymentFormCode 43332B for each PaymentInformation package 43320B.

Referring to FIG. 433, the Party package 43322B includes a PayerParty entity 43340B and a PayeeParty entity 43356B at the fourth level 43308. The PayerParty entity 43340B is of a type AGDT 43344B "BusinessTransactionDocumentParty" 43346B. There is zero or one 43342B PayerParty entity 43340B for each Party package 43322B. The PayerParty entity 43340B includes an InternalID entity 43348B at the fifth level 43310. The InternalID entity 43348B is of the type BGDT 43352B "PartyID" 43354B. There is one 43350B InternalID entity 43348B for each PayerParty entity 43340B.

The PayeeParty entity 43356B is of the type AGDT 43360B "BusinessTransactionDocumentParty" 43362B. There is zero or one 43358B PayeeParty entity 43356B for each Party package 43322B.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A non-transitory, tangible computer readable medium including program code for providing a message-based interface for exchanging product-related information between a buyer and a vendor for planning purposes, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for communicating information associated with at least one product-related activity of the buyer for use in performing supply planning for the buyer that includes a first message package derived from the common business object model and hierarchically organized in memory as:

a product activity message entity; and a product activity package comprising a product activity entity and an item package, where the item package includes a product activity item and a product information package, and further where the product information package includes a product entity;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

2. The computer readable medium of claim 1, wherein the product activity package further comprises at least one of the following: a party package and a business transaction document request package.

3. The computer readable medium of claim 1, wherein the product activity entity comprises at least one of the following: a validity period and a note.

4. A non-transitory, tangible computer readable medium including program code for providing a message-based interface for requesting information about the creditworthiness of a party, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for sending a query regarding the creditworthiness of the party that includes a first message package derived from the common business object model and hierarchically organized in memory as:

a credit worthiness query message entity; and a credit worthiness query package comprising a credit worthiness query entity and a party package, where the credit worthiness query entity includes a credit agency report retrieval permission indicator, and where the party package includes a debtor party entity;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

5. The computer readable medium of claim 4, wherein the credit worthiness query package further includes a product information package.

6. The computer readable medium of claim 4, wherein the party package includes at least one of a creditor party entity and a seller party entity.

7. A non-transitory, tangible computer readable medium including program code for providing a message-based interface for receiving credit information about a party from a credit agency, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for inquiring to the credit agency for credit information about the party that includes a first message package derived from the common business object model and hierarchically organized in memory as:

a credit agency report query message entity; and a credit agency report query package comprising a credit agency report query entity, a party package, and a service package, where the credit agency report query entity includes a reason code, where the party package includes a debtor party, and where the service package includes a service entity, where the service entity further includes a credit agency ID;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

8. The computer readable medium of claim 7, wherein the debtor party entity further includes at least one of the following: a standard ID and a credit agency ID.

9. The computer readable medium of claim 7, wherein the party package further includes at least one of the following: an address, an incorporation date, and a birth date.

10. A non-transitory, tangible computer readable medium including program code for providing a message-based interface for providing information about deliveries of goods between a supplier and manufacturer, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for providing notice to a goods recipient about a planned arrival, pickup or issue date for a ready-to-send delivery that includes a first message package derived from the common business object model and hierarchically organized in memory as:

a despatched delivery notification message entity; and a delivery package comprising a delivery entity, a party package, a location package, and a delivery item package, where the delivery entity includes a delivery ID and a creation date time, where the party package includes a vendor party and a product recipient party, where the location package includes a ship-to location, and where the delivery item package includes at least one item entity and a business transaction document reference package, further where each item entity includes a volume measure, and further where the business transaction document reference package includes a sales order reference;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

11. The computer readable medium of claim 10, wherein the delivery entity further includes at least one of the following: a gross weight measure, a net weight measure, a volume measure, an arrival date time, an issue date time, and a carrier handover date time.

12. The computer readable medium of claim 10, wherein the delivery package further includes at least one of the following: a gross weight measure, a net weight measure, a volume measure, an arrival date time, an issue date time, a carrier handover date time, a group ID, a waybill ID, a transport mode code, a dangerous goods indicator, and a note.

13. A non-transitory, tangible computer readable medium including program code for providing a message-based interface for creation and management of electronic publication and viewing of a catalogue for a company or enterprise, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting the publishing of a new or modified catalogue or deletion of a published catalogue that includes a first message package derived from the common business object model and hierarchically organized in memory as:

a catalogue publication message entity; and a transmission information package and a catalogue package, the catalogue package comprising a catalogue entity, where the catalogue entity includes an ID and a type code;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

14. The computer readable medium of claim 13, wherein the transmission information package includes a transmission header, where the transmission header includes an ID and a package ordinal number value.

15. The computer readable medium of claim 13, wherein the catalogue package includes at least one of the following: a global information package, a model package, and a content package.

16. A distributed system operating in a landscape of computer systems providing message-based services defined in a service registry, the system comprising:

a graphical user interface comprising computer readable instructions, embedded on tangible media, for communicating information associated with at least one product-related activity of a buyer for use in performing supply planning for the buyer using a request;

a first memory storing a user interface controller for processing the request and involving a message including a message package derived from a common business object model, where the common business object model includes business objects having relationships that enable derivation of message-based service interfaces and message packages, the message package hierarchically organized as:

a product activity message entity; and a product activity package comprising a product activity entity and an item package, where the item package includes a product activity item and a product information package, and further where the product information package includes a product entity; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

17. The distributed system of claim 16, wherein the first memory is remote from the graphical user interface.

18. The distributed system of claim 16, wherein the first memory is remote from the second memory.

19. A distributed system operating in a landscape of computer systems providing message-based services defined in a service registry, the system comprising:

a graphical user interface comprising computer readable instructions, embedded on tangible media, for sending a query regarding the creditworthiness of the party using a request;

a first memory storing a user interface controller for processing the request and involving a message including a message package derived from a common business object model, where the common business object model includes business objects having relationships that enable derivation of message-based service interfaces and message packages, the message package hierarchically organized as:

a credit worthiness query message entity; and a credit worthiness query package comprising a credit worthiness query entity and a party package, where the credit worthiness query entity includes a credit agency report retrieval permission indicator, and where the party package includes a debtor party entity; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

20. The distributed system of claim 19, wherein the first memory is remote from the graphical user interface.

21. The distributed system of claim 20, wherein the first memory is remote from the second memory.

22. A distributed system operating in a landscape of computer systems providing message-based services defined in a service registry, the system comprising:

a graphical user interface comprising computer readable instructions, embedded on tangible media, for inquiring to a credit agency for credit information about a party;

a first memory storing a user interface controller for processing the request and involving a message including a message package derived from a common business object model, where the common business object model includes business objects having relationships that enable derivation of message-based service interfaces and message packages, the message package hierarchically organized as:

a credit agency report query message entity; and a credit agency report query package comprising a credit agency report query entity, a party package, and a service package, where the credit agency report query entity includes a reason code, where the party package includes a debtor party, and where the service package includes a service entity, where the service entity further includes a credit agency ID; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

23. The distributed system of claim 22, wherein the first memory is remote from the graphical user interface.

24. The distributed system of claim 23, wherein the first memory is remote from the second memory.

25. A distributed system operating in a landscape of computer systems providing message-based services defined in a service registry, the system comprising:

a graphical user interface comprising computer readable instructions, embedded on tangible media, for providing notice to a goods recipient about a planned arrival, pickup or issue date for a ready-to-send delivery;

a first memory storing a user interface controller for processing the request and involving a message including a message package derived from a common business object model, where the common business object model includes business objects having relationships that enable derivation of message-based service interfaces and message packages, the message package hierarchically organized as:

a despatched delivery notification message entity; and a delivery package comprising a delivery entity, a party package, a location package, and a delivery item package, where the delivery entity includes a delivery ID and a creation date time, where the party package includes a vendor party and a product recipient party, where the location package includes a ship-to location, and where the delivery item package includes at least one item entity and a business transaction document reference package, further where each item entity includes a volume measure, and further where the business transaction document reference package includes a sales order reference; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

26. The distributed system of claim 25, wherein the first memory is remote from the graphical user interface.

27. The distributed system of claim 26, wherein the first memory is remote from the second memory.

28. A distributed system operating in a landscape of computer systems providing message-based services defined in a service registry, the system comprising:

a graphical user interface comprising computer readable instructions, embedded on tangible media, for requesting the publishing of a new or modified catalogue or deletion of a published catalogue;

a first memory storing a user interface controller for processing the request and involving a message including a message package derived from a common business object model, where the common business object model includes business objects having relationships that enable derivation of message-based service interfaces and message packages, the message package hierarchically organized as:

a catalogue publication message entity; and a transmission information package and a catalogue package, the catalogue package comprising a catalogue entity, where the catalogue entity includes an ID and a type code; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

29. The distributed system of claim 28, wherein the first memory is remote from the graphical user interface.

30. The distributed system of claim 28, wherein the first memory is remote from the second memory.

31. The computer readable medium of claim 1, the derived message-based interfaces further including: a payment due notification interface, a delivery information interface, a despatched delivery notification interface, a received delivery notification interface, a personnel time sheet information interface, a credit worthiness query interface, a credit worthiness response interface, a billing due notification interface, a billing due cancellation request interface, an invoicing due notification interface, an invoicing due cancellation request interface, an inventory change notification interface, an inventory change accounting notification interface, a credit agency report query interface, a credit agency report response interface, an invoice accounting cancellation request interface, an inventory change accounting cancellation request interface, a sales order fulfillment request interface, a sales order fulfillment confirmation interface, a product activity notification interface, a delivery schedule notification interface, an invoice accounting notification interface, a delivery execution request interface, a catalogue update notification interface, a catalogue publication request interface, a catalogue publication transmission package notification interface, a catalogue publication confirmation interface, a catalogue publication transmission cancellation request interface, a catalogue publication transmission cancellation confirmation interface, a catalogue publication transmission item lock request interface, a catalogue publication transmission item lock confirmation interface, a purchase order information interface, a tax due notification interface, an invoice issued information interface, a purchase requirement request interface, a purchase requirement confirmation interface, a source of supply notification interface, a purchase order request interface, a purchase order change request interface, a purchase order cancellation request interface, a purchase order confirmation interface, a service acknowledgement request interface, a service acknowledgement confirmation interface, a request for quote (RFQ) request interface, an RFQ change request, an RFQ cancellation request, an RFQ result notification, and a quote notification.

* * * * *

UNITED STATES PATENT AND TRADEMARK OFFICE

CERTIFICATE OF CORRECTION

PATENT NO. : 8,694,397 B2
APPLICATION NO. : 11/155368
DATED : April 8, 2014
INVENTOR(S) : Michael Seubert et al.

It is certified that error appears in the above-identified patent and that said Letters Patent is hereby corrected as shown below:

On The Title Page, item (60) Delete "Provisional application No. 60/577,453, filed on Jun. 4, 2004,"

Signed and Sealed this
Eighth Day of September, 2015

Michelle K. Lee
*Director of the United States Patent and Trademark Office*